US008566193B2

(12) United States Patent
Singh et al.

(10) Patent No.: US 8,566,193 B2
(45) Date of Patent: Oct. 22, 2013

(54) CONSISTENT SET OF INTERFACES DERIVED FROM A BUSINESS OBJECT MODEL

(75) Inventors: Abhinava Pratap Singh, Uttarpara (IN); Andreas Esau, Oestringen (DE); Andreas Huber-Buschbeck, Heiligkreuzsteinach (DE); Andreas Seibel, Rauenberg (DE); Astrid Doppenschmidt, Muhlhausen (DE); Bleickard Langendoerfer, Heidelberg (DE); Chandramohan Reddy Yengoti, Heidelberg (DE); Christian Hissler, Nonnweiler (DE); Cornel Leinenkugel, Dossenheim (DE); Devasena Rajamohan, Santa Clara, CA (US); Gerd Egen, Dossenheim (DE); Gerold Wellenhofer, Heidelberg (DE); Gregor Arlt, Heidelberg (DE); Hans-Peter Thienel, Wiesloch (DE); Heiko Theissen, Heidelberg (DE); Jens-Martin Wolle, Leimen (DE); Jerome Poulin, Montreal (CA); Kerstin Hambrecht, Heidelberg (DE); Klaus Zumbach, Schoenbrunn-Allemuhl (DE); Madhavi Koujalagi, Bangalore (IN); Moghaddam Masoumeh, Trippstadt (DE); Oliver Vonderheid, Ludwigshafen (DE); Ralf Wagenknecht, Boehl-Iggelheim (DE); Siarhei Ulasenka, Mannheim (DE); Stefan Christian Boehm, Bruhl (DE); Susanne Doenig, Puettlingen (DE); Svetlana Rebholz, Rhein (DE); Thiemo Lindemann, Spechbach (DE); Thomas Schneider, Heidelberg (DE); Udo Herbst, Pfedelbach (DE); Uwe Oehler, Offenburg-Zunsweier (DE); Rolf Waltemathe, Blieskastel (DE); Carsten Pluder, Spiesen-Elversberg (DE); Harsh Panwar, Bangalore (IN); Eberhard Schick, Heidelberg (DE); Corinne Reisert, Mannheim (DE); Juergen Hollberg, Wiesloch (DE); Peter Wadewitz, Hockenheim (DE); Shankar V, Bangalore (IN); Christof Rausse, Heidelberg (DE)

(73) Assignee: SAP AG, Walldorf (DE)

( * ) Notice: Subject to any disclaimer, the term of this patent is extended or adjusted under 35 U.S.C. 154(b) by 793 days.

(21) Appl. No.: 11/640,422

(22) Filed: Dec. 15, 2006

(65) Prior Publication Data

US 2008/0133303 A1 Jun. 5, 2008

Related U.S. Application Data

(60) Provisional application No. 60/837,196, filed on Aug. 11, 2006.

(51) Int. Cl.
*G06Q 40/00* (2012.01)
*G06Q 10/00* (2012.01)
*G06Q 30/00* (2012.01)

(52) U.S. Cl.
CPC ................ *G06Q 40/00* (2013.01); *G06Q 10/00* (2013.01); *G06Q 30/00* (2013.01)
USPC ............................. 705/35; 705/7.12; 705/340

(58) Field of Classification Search
CPC ........ G06Q 40/00; G06Q 10/00; G06Q 30/00
USPC .......................................... 705/35, 7.12, 340
See application file for complete search history.

(56) References Cited

U.S. PATENT DOCUMENTS

| | | | |
|---|---|---|---|
| 3,223,321 | A | 12/1965 | Baumgartner |
| 5,126,936 | A | 6/1992 | Champion et al. |

(Continued)

FOREIGN PATENT DOCUMENTS

| | | |
|---|---|---|
| CN | 1501296 | 6/2004 |
| CN | 1609866 | 4/2005 |

(Continued)

OTHER PUBLICATIONS

He, Ning et al.; "B2B Contract Implementation Using Windows DNS"; 2001; pp. 71-79.

(Continued)

*Primary Examiner* — Ella Colbert
*Assistant Examiner* — Scott S Trotter
(74) *Attorney, Agent, or Firm* — Fish & Richardson P.C.

(57) ABSTRACT

A business object model, which reflects data that is used during a given business transaction, is utilized to generate interfaces. This business object model facilitates commercial transactions by providing consistent interfaces that are suitable for use across industries, across businesses, and across different departments within a business during a business transaction.

11 Claims, 1722 Drawing Sheets

(56) References Cited

U.S. PATENT DOCUMENTS 5,210,686 A 5/1993 Jernigan
5,247,575 A 9/1993 Sprague et al.
5,255,181 A 10/1993 Chapman et al.
5,321,605 A 6/1994 Chapman et al.
5,463,555 A 10/1995 Ward et al.
5,787,237 A 7/1998 Reilly
5,812,987 A 9/1998 Luskin et al.
5,966,695 A 10/1999 Melchione et al.
5,970,465 A 10/1999 Dietrich et al.
5,970,475 A 10/1999 Barnes et al.
5,983,284 A 11/1999 Argade
6,047,264 A 4/2000 Fisher et al.
6,058,378 A 5/2000 Clark et al.
6,073,137 A 6/2000 Brown et al.
6,092,196 A 7/2000 Reiche
6,104,393 A 8/2000 Santos-Gomez
6,115,690 A 9/2000 Wong
6,125,391 A 9/2000 Meltzer et al.
6,138,118 A 10/2000 Koppstein et al.
6,154,732 A 11/2000 Tarbox
6,222,533 B1 * 4/2001 Notani et al. ................. 715/733
6,226,675 B1 5/2001 Meltzer et al.
6,229,551 B1 5/2001 Huang
6,311,165 B1 10/2001 Coutts et al.
6,327,700 B1 12/2001 Chen et al.
6,331,972 B1 12/2001 Harris et al.
6,332,163 B1 * 12/2001 Bowman-Amuah .......... 709/231
6,424,979 B1 7/2002 Livingston et al.
6,434,159 B1 8/2002 Woodward et al.
6,438,594 B1 8/2002 Bowman-Amuah
6,542,912 B2 4/2003 Meltzer et al.
6,591,260 B1 7/2003 Schwarzhoff et al.
6,725,122 B2 4/2004 Mori et al.
6,738,747 B1 5/2004 Tanaka et al.
6,745,229 B1 6/2004 Hauryluck et al.
6,763,353 B2 7/2004 Li et al.
6,775,647 B1 8/2004 Evans et al.
6,868,370 B1 3/2005 Burbridge et al.
6,937,992 B1 8/2005 Benda et al.
6,970,844 B1 11/2005 Bierenbaum
7,020,594 B1 3/2006 Chacon
7,039,606 B2 5/2006 Hoffman et al.
7,076,449 B2 * 7/2006 Tsunenari et al. .............. 705/26
7,131,069 B1 10/2006 Rush et al.
7,206,768 B1 4/2007 deGroeve et al.
7,249,157 B2 7/2007 Stewart et al.
7,249,195 B2 7/2007 Panec et al.
7,269,569 B2 9/2007 Spira et al.
7,292,965 B1 11/2007 Mehta et al.
7,321,864 B1 1/2008 Gendler
7,363,271 B2 4/2008 Morimoto
7,379,931 B2 5/2008 Morinville
7,383,990 B2 6/2008 Veit
7,406,358 B2 7/2008 Preiss
7,426,520 B2 9/2008 Gorelik et al.
7,481,367 B2 1/2009 Fees et al.
7,509,278 B2 3/2009 Jones
7,515,697 B2 4/2009 Eng et al.
7,516,088 B2 4/2009 Johnson et al.
7,536,697 B2 5/2009 Wiseman et al.
7,574,383 B1 * 8/2009 Parasnis et al. ................. 705/28
7,617,328 B2 11/2009 Lewis et al.
7,627,504 B2 12/2009 Brady et al.
7,634,482 B2 12/2009 Mukherjee et al.
7,689,711 B2 3/2010 Brouk et al.
7,788,319 B2 8/2010 Schmidt et al.
7,805,383 B2 9/2010 Veit et al.
7,853,491 B2 12/2010 Wittmer et al.
7,865,426 B2 1/2011 Volpert
7,873,965 B2 1/2011 Hayton et al.
7,895,209 B2 2/2011 Spence et al.
7,941,236 B2 5/2011 Spearman
8,082,243 B2 12/2011 Gorelik et al.
8,150,798 B2 4/2012 Ma et al.
2001/0042032 A1 11/2001 Crawshaw et al.
2001/0047372 A1 11/2001 Gorelik et al.
2002/0013721 A1 1/2002 Dabbiere et al.
2002/0026394 A1 2/2002 Savage et al.
2002/0046053 A1 4/2002 Hare et al.
2002/0052754 A1 5/2002 Joyce et al.
2002/0072988 A1 6/2002 Aram
2002/0087481 A1 7/2002 Harif
2002/0087483 A1 7/2002 Harif
2002/0099634 A1 7/2002 Coutts et al.
2002/0107765 A1 8/2002 Walker
2002/0112171 A1 8/2002 Ginter et al.
2002/0138318 A1 9/2002 Ellis et al.
2002/0147668 A1 10/2002 Smith et al.
2002/0152104 A1 10/2002 Ojha et al.
2002/0152145 A1 10/2002 Wanta et al.
2002/0156693 A1 10/2002 Stewart et al.
2002/0156930 A1 10/2002 Velasquez
2002/0157017 A1 10/2002 Mi et al.
2002/0169657 A1 11/2002 Singh et al.
2002/0184070 A1 12/2002 Chen et al.
2002/0186876 A1 12/2002 Jones et al.
2002/0194045 A1 12/2002 Shay et al.
2003/0004799 A1 1/2003 Kish
2003/0041178 A1 2/2003 Brouk et al.
2003/0069648 A1 4/2003 Douglas et al.
2003/0086594 A1 5/2003 Gross
2003/0120502 A1 6/2003 Robb et al.
2003/0120665 A1 6/2003 Fox et al.
2003/0126077 A1 7/2003 Kantor et al.
2003/0167193 A1 9/2003 Jones et al.
2003/0171962 A1 9/2003 Hirth et al.
2003/0172007 A1 9/2003 Helmolt et al.
2003/0172135 A1 9/2003 Bobick et al.
2003/0195815 A1 10/2003 Li et al.
2003/0204452 A1 10/2003 Wheeler
2003/0208389 A1 11/2003 Kurihara et al.
2003/0212614 A1 11/2003 Chu et al.
2003/0216978 A1 11/2003 Sweeney et al.
2003/0220875 A1 11/2003 Lam et al.
2003/0229522 A1 12/2003 Thompson et al.
2003/0229550 A1 12/2003 DiPrima et al.
2003/0233295 A1 12/2003 Tozawa et al.
2003/0236748 A1 12/2003 Gressel et al.
2004/0015366 A1 1/2004 Wiseman et al.
2004/0024662 A1 2/2004 Gray et al.
2004/0034577 A1 2/2004 Van Hoose et al.
2004/0039665 A1 2/2004 Ouchi
2004/0073510 A1 4/2004 Logan
2004/0083201 A1 4/2004 Sholl et al.
2004/0083233 A1 4/2004 Willoughby
2004/0133445 A1 7/2004 Rajan et al.
2004/0138942 A1 7/2004 Pearson et al.
2004/0148227 A1 7/2004 Tabuchi et al.
2004/0172360 A1 9/2004 Mabrey et al.
2004/0186891 A1 9/2004 Panec et al.
2004/0187140 A1 9/2004 Aigner et al.
2004/0220910 A1 11/2004 Zang et al.
2004/0254945 A1 12/2004 Schmidt et al.
2004/0267714 A1 12/2004 Frid et al.
2005/0015273 A1 1/2005 Iyer
2005/0021366 A1 * 1/2005 Pool et al. ......................... 705/1
2005/0033588 A1 2/2005 Ruiz et al.
2005/0038744 A1 2/2005 Viijoen
2005/0049903 A1 3/2005 Raja
2005/0055369 A1 3/2005 Gorelik et al.
2005/0071262 A1 3/2005 Kobeh et al.
2005/0080640 A1 4/2005 Bhaskaran et al.
2005/0108085 A1 5/2005 Dakar et al.
2005/0131947 A1 6/2005 Laub et al.
2005/0159997 A1 7/2005 John
2005/0171833 A1 8/2005 Jost et al.
2005/0182639 A1 8/2005 Dale
2005/0187797 A1 8/2005 Johnson
2005/0187866 A1 8/2005 Lee
2005/0194431 A1 9/2005 Fees et al.
2005/0194439 A1 9/2005 Zuerl et al.
2005/0197849 A1 9/2005 Fotteler et al.
2005/0197851 A1 9/2005 Veit
2005/0197878 A1 9/2005 Fotteler et al.

(56) References Cited

U.S. PATENT DOCUMENTS

| | | | | |
|---|---|---|---|---|
| 2005/0197881 | A1 | 9/2005 | Fotteler et al. | |
| 2005/0197882 | A1 | 9/2005 | Fotteler et al. | |
| 2005/0197886 | A1 | 9/2005 | Veit | |
| 2005/0197887 | A1 | 9/2005 | Zuerl et al. | |
| 2005/0197896 | A1 | 9/2005 | Veit et al. | |
| 2005/0197897 | A1 | 9/2005 | Veit et al. | |
| 2005/0197898 | A1 | 9/2005 | Veit et al. | |
| 2005/0197899 | A1 | 9/2005 | Veit et al. | |
| 2005/0197900 | A1 | 9/2005 | Veit | |
| 2005/0197901 | A1 | 9/2005 | Veit et al. | |
| 2005/0197902 | A1 | 9/2005 | Veit | |
| 2005/0197928 | A1 | 9/2005 | Fotteler et al. | |
| 2005/0197941 | A1 | 9/2005 | Veit | |
| 2005/0209732 | A1 | 9/2005 | Audimoolam et al. | |
| 2005/0210406 | A1 | 9/2005 | Biwer et al. | |
| 2005/0216321 | A1 | 9/2005 | Veit | |
| 2005/0216371 | A1 | 9/2005 | Fotteler et al. | |
| 2005/0216421 | A1 | 9/2005 | Barry et al. | |
| 2005/0222888 | A1 | 10/2005 | Hosoda et al. | |
| 2005/0222896 | A1 | 10/2005 | Rhyne et al. | |
| 2005/0222945 | A1 | 10/2005 | Pannicke et al. | |
| 2005/0228821 | A1 | 10/2005 | Gold | |
| 2005/0234754 | A1 | 10/2005 | Veit | |
| 2005/0246240 | A1 | 11/2005 | Padilla | |
| 2005/0256753 | A1 | 11/2005 | Veit et al. | |
| 2006/0004934 | A1 | 1/2006 | Guldner et al. | |
| 2006/0005098 | A1 | 1/2006 | Lotz et al. | |
| 2006/0020515 | A1 * | 1/2006 | Lee et al. | 705/22 |
| 2006/0026552 | A1 | 2/2006 | Mazzitelli et al. | |
| 2006/0026586 | A1 | 2/2006 | Remmel et al. | |
| 2006/0036941 | A1 | 2/2006 | Neil | |
| 2006/0047574 | A1 | 3/2006 | Sundaram et al. | |
| 2006/0047598 | A1 | 3/2006 | Hansen | |
| 2006/0059005 | A1 | 3/2006 | Horn et al. | |
| 2006/0059059 | A1 | 3/2006 | Horn et al. | |
| 2006/0059060 | A1 | 3/2006 | Horn et al. | |
| 2006/0069598 | A1 | 3/2006 | Schweitzer et al. | |
| 2006/0069629 | A1 | 3/2006 | Schweitzer et al. | |
| 2006/0069632 | A1 | 3/2006 | Kahn et al. | |
| 2006/0074728 | A1 | 4/2006 | Schweitzer et al. | |
| 2006/0080338 | A1 | 4/2006 | Seubert et al. | |
| 2006/0085336 | A1 | 4/2006 | Seubert et al. | |
| 2006/0085412 | A1 | 4/2006 | Johnson et al. | |
| 2006/0085450 | A1 | 4/2006 | Seubert et al. | |
| 2006/0089885 | A1 | 4/2006 | Finke et al. | |
| 2006/0095373 | A1 | 5/2006 | Venkatasubramanian et al. | |
| 2006/0184435 | A1 | 8/2006 | Mostowfi | |
| 2006/0212376 | A1 | 9/2006 | Snyder et al. | |
| 2006/0280302 | A1 | 12/2006 | Baumann et al. | |
| 2006/0282360 | A1 | 12/2006 | Kahn et al. | |
| 2007/0027742 | A1 | 2/2007 | Emuchay et al. | |
| 2007/0043583 | A1 | 2/2007 | Davulcu et al. | |
| 2007/0055688 | A1 | 3/2007 | Blattner | |
| 2007/0067411 | A1 | 3/2007 | Angelov | |
| 2007/0078799 | A1 | 4/2007 | Huber-Buschbeck et al. | |
| 2007/0112574 | A1 | 5/2007 | Greene | |
| 2007/0124227 | A1 | 5/2007 | Dembo et al. | |
| 2007/0129978 | A1 | 6/2007 | Shirasu et al. | |
| 2007/0132585 | A1 | 6/2007 | Llorca et al. | |
| 2007/0150387 | A1 | 6/2007 | Seubert et al. | |
| 2007/0150836 | A1 | 6/2007 | Deggelmann et al. | |
| 2007/0156428 | A1 | 7/2007 | Brecht-Tillinger et al. | |
| 2007/0156545 | A1 | 7/2007 | Lin | |
| 2007/0156552 | A1 | 7/2007 | Manganiello | |
| 2007/0156690 | A1 | 7/2007 | Moser et al. | |
| 2007/0165622 | A1 | 7/2007 | O'Rourke et al. | |
| 2007/0214065 | A1 | 9/2007 | Kahlon et al. | |
| 2007/0225949 | A1 | 9/2007 | Sundararajan et al. | |
| 2007/0226090 | A1 | 9/2007 | Stratton | |
| 2007/0255639 | A1 | 11/2007 | Seifert | |
| 2007/0265860 | A1 | 11/2007 | Herrmann et al. | |
| 2007/0265862 | A1 | 11/2007 | Freund et al. | |
| 2007/0288250 | A1 | 12/2007 | Lemcke et al. | |
| 2007/0294159 | A1 | 12/2007 | Cottle | |
| 2008/0005012 | A1 | 1/2008 | Deneef | |
| 2008/0016242 | A1 | 1/2008 | Panec et al. | |
| 2008/0021754 | A1 | 1/2008 | Horn et al. | |
| 2008/0040243 | A1 | 2/2008 | Chang et al. | |
| 2008/0046104 | A1 | 2/2008 | Van Camp et al. | |
| 2008/0046421 | A1 | 2/2008 | Bhatia et al. | |
| 2008/0120129 | A1 | 5/2008 | Seubert et al. | |
| 2008/0120190 | A1 | 5/2008 | Joao et al. | |
| 2008/0120204 | A1 | 5/2008 | Conner et al. | |
| 2008/0120313 | A1 | 5/2008 | O'Brien et al. | |
| 2008/0133303 | A1 | 6/2008 | Singh et al. | |
| 2008/0154969 | A1 | 6/2008 | DeBie | |
| 2008/0162266 | A1 | 7/2008 | Griessmann et al. | |
| 2008/0184265 | A1 | 7/2008 | Kasi et al. | |
| 2008/0196108 | A1 | 8/2008 | Dent et al. | |
| 2008/0215354 | A1 | 9/2008 | Halverson et al. | |
| 2008/0243578 | A1 | 10/2008 | Veit | |
| 2008/0288317 | A1 | 11/2008 | Kakar | |
| 2009/0006203 | A1 | 1/2009 | Fordyce et al. | |
| 2009/0063287 | A1 | 3/2009 | Tribout et al. | |
| 2009/0077074 | A1 | 3/2009 | Hosokawa | |
| 2009/0089198 | A1 | 4/2009 | Kroutik | |
| 2009/0094274 | A1 | 4/2009 | Gorelik et al. | |
| 2009/0164497 | A1 | 6/2009 | Steinmaier et al. | |
| 2009/0192926 | A1 | 7/2009 | Tarapata | |
| 2009/0193432 | A1 | 7/2009 | McKegney et al. | |
| 2009/0222360 | A1 | 9/2009 | Schmitt et al. | |
| 2009/0248429 | A1 | 10/2009 | Doenig et al. | |
| 2009/0248430 | A1 | 10/2009 | Hubert et al. | |
| 2009/0248431 | A1 | 10/2009 | Schoknecht et al. | |
| 2009/0248463 | A1 | 10/2009 | Piochon et al. | |
| 2009/0248473 | A1 | 10/2009 | Doenig et al. | |
| 2009/0248487 | A1 | 10/2009 | Santoso et al. | |
| 2009/0248547 | A1 | 10/2009 | Doenig et al. | |
| 2009/0248558 | A1 | 10/2009 | Hollberg et al. | |
| 2009/0248586 | A1 | 10/2009 | Kaisermayr et al. | |
| 2009/0248698 | A1 | 10/2009 | Rehmann | |
| 2009/0249358 | A1 | 10/2009 | Schuette | |
| 2009/0249362 | A1 | 10/2009 | Lindemann et al. | |
| 2009/0271245 | A1 | 10/2009 | Joshi et al. | |
| 2009/0300578 | A1 | 12/2009 | Neil | |
| 2009/0326988 | A1 | 12/2009 | Barth et al. | |
| 2009/0327009 | A1 | 12/2009 | Schmitt et al. | |
| 2009/0327105 | A1 | 12/2009 | Moussa et al. | |
| 2009/0327106 | A1 | 12/2009 | Bartelt et al. | |
| 2010/0001834 | A1 | 1/2010 | Brunswig et al. | |
| 2010/0014510 | A1 | 1/2010 | Boreli et al. | |
| 2010/0070391 | A1 | 3/2010 | Storr et al. | |
| 2010/0070395 | A1 | 3/2010 | Elkeles et al. | |
| 2010/0106555 | A1 | 4/2010 | Mneimneh et al. | |
| 2010/0131379 | A1 | 5/2010 | Dorais et al. | |
| 2010/0131394 | A1 | 5/2010 | Rutsch et al. | |
| 2010/0153297 | A1 | 6/2010 | Haaf et al. | |
| 2010/0161425 | A1 | 6/2010 | Sideman | |
| 2010/0217820 | A1 | 8/2010 | Brouk et al. | |
| 2010/0218245 | A1 | 8/2010 | Brouk et al. | |
| 2010/0241729 | A1 | 9/2010 | Angelov | |
| 2010/0306536 | A1 | 12/2010 | Brouk et al. | |
| 2011/0046775 | A1 | 2/2011 | Bailey et al. | |
| 2011/0077999 | A1 | 3/2011 | Becker et al. | |
| 2011/0078048 | A1 | 3/2011 | Becker et al. | |
| 2011/0153767 | A1 | 6/2011 | Coldicott et al. | |
| 2011/0276636 | A1 | 11/2011 | Cheng et al. | |

FOREIGN PATENT DOCUMENTS

| | | |
|---|---|---|
| CN | 1632806 | 6/2005 |
| CN | 1765138 | 4/2006 |
| CN | 1767537 | 5/2006 |
| CN | 101174957 | 5/2008 |
| CN | 101288092 | 10/2008 |
| WO | 2008/005102 | 1/2008 |

OTHER PUBLICATIONS

FSML—Financial Services Markup Language (Jul. 14, 1999) http://xml.coverpages.org/FSML-v1500a.pdf; pp. 1-159.

Webster's Revised Unabridged Dictionary (1913+1828); Def. "merchandise".

(56) References Cited

OTHER PUBLICATIONS

Statement in Accordance with the Notice from the European Patent Office dated Oct. 1, 2007 Concerning Business Methods—EPC; Official Journal of the European Patent Office; Munich; Nov. 1, 2007; pp. 592-593.
Lynn, Chris; "Sony Enters Brand Asset Management Market"; The Seybold Report; Analyzing Publishing Technologies; Aug. 4, 2004; <www.Seybold365.com>; 3 pages.
Office Action issued in related U.S. Appl. No. 11/803,178 on Jun. 29, 2009; 5 pages.
Office Action issued in related U.S. Appl. No. 11/803,178 on Mar. 4, 2010; 43 pages.
Office Action issued in related U.S. Appl. No. 11/775,821 on Jan. 22, 2010; 16 pages.
Office Action issued in related U.S. Appl. No. 11/364,538 on Aug. 4, 2009; 5 pages.
Office Action issued in related U.S. Appl. No. 11/364,538 on Mar. 4, 2010; 40 pages.
Office Action issued in related U.S. Appl. No. 11/731,857 on May 15, 2009; 11 pages.
Office Action issued in related U.S. Appl. No. 11/731,857 on Feb. 4, 2010; 22 pages.
Office Action issued in related U.S. Appl. No. 11/864,786 on Jun. 22, 2009; 7 pages.
Office Action issued in related U.S. Appl. No. 11/864,786 on Mar. 3, 2010; 12 pages.
Office Action issued in related U.S. Appl. No. 11/864,832 on Sep. 18, 2009; 14 pages.
Notice of Allowance issued in related U.S. Appl. No. 11/864,832 on Mar. 24, 2010; 11 pages.
Office Action issued in related U.S. Appl. No. 12/059,867 on Aug. 18, 2009; 37 pages.
Office Action issued in related U.S. Appl. No. 12/059,867 on Feb. 22, 2010; 24 pages.
Office Action issued in related U.S. Appl. No. 12/060,178 on Dec. 7, 2009; 6 pages.
Office Action issued in related U.S. Appl. No. 12/060,171 on Aug. 11, 2009; 11 pages.
Office Action issued in related U.S. Appl. No. 12/060,171 on Mar. 19, 2010; 10 pages.
Office Action issued in related U.S. Appl. No. 11/145,464 on Aug. 5, 2009; 31 pages.
Office Action issued in related U.S. Appl. No. 11/145,464 on Feb. 5, 2010; 57 pages.
Office Action issued in related U.S. Appl. No. 11/155,368 on May 14, 2009; 6 pages.
Office Action issued in related U.S. Appl. No. 11/155,368 on Dec. 10, 2009; 43 pages.
Office Action issued in related U.S. Appl. No. 11/166,065 on Jun. 24, 2009; 6 pages.
Office Action issued in related U.S. Appl. No. 11/166,065 on Mar. 3, 2010; 25 pages.
Communication Pursuant to Article 94(3) EPC issued in related European Application No. 05757432.9 on Jan. 26, 2009; 4 pages.
Supplementary European Search Report issued in related European Application No. 05823434.5 on Sep. 28, 2009; 3 pages.
Supplementary European Search Report issued in related European Application No. 05766672.9 on Oct. 6, 2009; 3 pages.
SAP Structured Entity Relationship Model (SAP-SERM) for R/3 System Release 4.0 Introduction and Index; Dec. 1998; 26 pages.
SAP Structured Entity Relationship Model (SAP-SERM) for R/3 System Release 4.0 (Part 1); Dec. 1998; 5954 pages.
SAP Structured Entity Relationship Model (SAP-SERM) for R/3 System Release 4.0 (Part 2); Dec. 1998; 7838 pages.
Zencke, Peter; "Engineering a Business Platform"; SAP AG 2005; Engineering BPP; [Online] previously available at URL www.sap.com/community/pub/webcast/2006_01_16_Analyst_Summit_Vegas/2006_01_16_Analyst Summit_Vegas_009.pdf ; 36 pages.
"UML in the .com Enterprise: Modeling CORBA, Components, XML/XMI and Metadata Workshop"; http://www.omg.org/news/meetings/workshops/uml_presentations.htm.
Medjahed, Brahim et al; "Business-to-Business Interactions: Issues and Enabling Technologies"; The VLDB Journall vol. 12, No. 1; Apr. 3, 2003; pp. 58-89.
Medjahed, Brahim et al.; "Composing Web Services on the Semantic Web"; The VLDB Journal; vol. 12, No. 4, Sep. 23, 2003; pp. 333-351.
Born, Marc et al.; "Customizing UML for Component Design"; www.dot-profile.de; UML Workshop, Palm Springs, CA; Nov. 2000.
Kappel, Gerti et al.; "A Framework for Workflow Management Systems Based on Objects, Rules, and Roles"; ACM Computing Surveys; ACM Press; vol. 32; Mar. 2000; 5 pages.
Skonnard, Aaron et al.; "BizTalk Server 2000: Architecture and Tools for Trading Partner Integration"; MSDn Magazine; 2000; ms-help://ms.msdnqtr.2003apr.1033/dnmag00/htmal/biztalk.htm; 7 pages.
Microsoft; "Creating an XML Web Service Proxy"; 2001; mshelp://ms.msdnqtr.2003apr.1033/cpguide/html/cpconcreatingwebserviceproxy.htm; 3 pages.
Proceedings of OMG Workshops; http://www.omg.org/news/meetings/workshops/proceedings.htm; pp. 1-3.
Meltzer, Bart et al.; "XML and Electronic Commerce: Enabling the Network Economy"; SIGMOD Record; ACM Press; vol. 27, No. 4; Dec. 1998; pp. 21-24.
Huhns, Michael N. et al.; "Automating Supply-Chain Mangement"; Jul. 15-19, 2002; pp. 1017-1024.
Soederstroem, Eva; "Standardising the Business Vocabulary of Standards"; SAC, Madrid, Spain; 2002; pp. 1048-1052.
Bastide, Remi et al.; "Formal Specification of CORBA Services: Experience and Lessons Learned"; 2000; pp. 105-117.
Glushko, Robert J. et al.; "An XML Framework for Agent-Based E-Commerce"; Communications of the ACM; vol. 42, No. 3; Mar. 1999; pp. 106-114.
Coen-Porisini, Alberto et al.; "A Formal Approach for Designing CORBA-Based Applications"; ACM Transactions on Software Engineering and Methodology; vol. 12, No. 2; Apr. 2003; pp. 107-151.
Yang, J. et al.; "Service Deployment for Virtual Enterprises"; IEEE; 2001; pp. 107-115.
Karp, Alan H.; "E-speak E-xplained"; Communications of the ACM; vol. 46, No. 7; Jul. 2003; pp. 113-118.
Gillibrand, David; "Essential Business Object Design"; Communications of the ACM; vol. 43, No. 2; Feb. 2000; pp. 117-119.
Cole, James et al.; "Extending Support for Contracts in ebXML"; IEEE; 2001; pp. 119-127.
DiNitto, Elisabetta et al.; "Deriving Executable Process Descriptions from UML"; ICSE '02; May 19-25, 2002; pp. 155-165.
Stumptner, Markus et al.; "On the Road to Behavior-Based Integration"; First Asia-Pacific Conferences on Conceptual Modelling; Dunedin, New Zealand; Jan. 2004; pp. 15-22.
Gosain, Sanjay et al.; "The Impact of Common E-Business Interfaces"; Communications of the ACM; vol. 46, No. 2; Dec. 2003; pp. 186-195.
Damodaran, Suresh; "B2B Integration over the Internet with XML—RosettaNet Successes and Challenges"; WWW2004; May 17-22, 2004; pp. 188-195.
Schulze, Wolfgang et al.; "Standardising on Workflow-Management—The OMG Workflow Management Facility"; SIGGROUP Bulletin; vol. 19, No. 1; Apr. 1998; pp. 24-30.
Sutherland, Jeff; "Business Objects in Corporate Information Systems"; ACM Computing Surveys; vol. 27, No. 2; Jun. 1995; pp. 274-276.
Arsanjani Ali; "Developing and Integrating Enterprise Components and Services"; Communications of the ACM; vol. 45, No. 10; Oct. 2002; pp. 31-34.
Kim, Dan Jong et al.; "A Comparison of B2B E-Service Solutions"; Communications of the ACM; vol. 46, No. 12; Dec. 2003; pp. 317-324.
Hasselbring, Wilhelm; "Information System Integration"; Communications of the ACM; vol. 43, No. 6; Jun. 2000; pp. 33-38.
Khosravi, Navid et al.; "An Approach to Building Model Driven Enterprise Systems in Nebras Enterprise Framework"; OOPSLA '02: Companion of the 17$^{th}$ Annual ACM SIGPLAN Conference on Object-Oriented Programming, Systems, Languages, and Applications; Nov. 4-8, 2002; pp. 32-33.

(56) References Cited

OTHER PUBLICATIONS

Hogg, K. et al.; "An Evaluation of Web Services in the Design of a B2B Application"; 27th Australasian Computer Science Conference; Dunedin, New Zealand; 2004; pp. 331-340.
Gruhn, Volker et al.; "Workflow Management Based on Process Model Repositories"; IEEE 1998; pp. 379-388.
Kim, HyoungDo; "Conceptual Modeling and Specification Generation for B2B Business Processes Based on ebXML"; SIGMOD Record; vol. 31, No. 1; Mar. 2002; pp. 37-42.
Siegel, Jon; "OMG Overview: CORBA and the OMA in Enterprise Computing"; Communications of the ACM; vol. 41, No. 10; Oct. 1998; pp. 37-43.
Yang, Jian et al.; "Interoperation Support for Electronic Business"; Communications of the ACM; vol. 43, No. 6; Jun. 2000; pp. 39-47.
Levi, Keith et al.; "A Goal-Driven Approach to Enterprise Component Identification and Specification"; Communications of the ACM; vol. 45, No. 10; Oct. 2002; pp. 45-52.
Terai, Koichi et al.; "Coordinating Web Services Based on Business Models"; 2003; pp. 473-478.
Aversano, Lerina et al.; "Introducing eServices in Business Process Models"; SEKE '02; Ischia Italy; Jul. 15-19, 2002; pp. 481-488.
Quin, Christoph et al.; "Business Data Management for Business-to-Business Electronic Commerce"; Sigmod Record; vol. 31, No. 1; Mar. 2002; pp. 49-54.
Sutherland. Jeff; "Why I Love the OMG: Emergence of a Business Object Component Architecture"; StandardView; vol. 6, No. 1; Mar. 1998; pp. 4-13.
Dógac, Asuman et al.; "An ebXML Infrastructure Implementation through UDDI Registries and RosettaNet PIPs"; ACM SIGMOD; Madison, Wisconsin; Jun. 4-6, 2002; pp. 512-523.
Lee, Jinyoul et al.; "Enterprise Integration with ERP and EAI"; Communications of the ACM; vol. 46, No. 2; Feb. 2003; pp. 54-60.
Bratthall, Lars G. et al.; "Integrating Hundreds of Products through One Architecture—The Industrial IT Architecture"; ICSE '02; Orlando, Florida; May 19-25, 2002; pp. 604-614.
Fingar, Peter; "Component-Based Frameworks for E-Commerce"; Communications of the ACM; vol. 43, No. 10; Oct. 2000; pp. 61-66.
Sprott, David; "Componentizing the Enterprise Application Packages"; Communications of the ACM; vol. 43, No. 4; Apr. 2000; pp. 63-69.
Gokhale, Aniruddha et al.; "Applying Model-Integrated Computing to Component Middleware and Enterprise Applications"; Communications of the ACM; vol. 45, No. 10; Oct. 2002: pp. 65-70.
Bussler, Christoph; "The Role of B2B Engines in Architectures"; SIGMOD Record; vol. 31, No. 1; Mar. 2002; pp. 67-72.
Fremantle. Paul et al.; "Enterprise Services"; Communications of the ACM; vol. 45, No. 10; Oct. 2002; pp. 77-79.
Trastour, David et al.; "Semantic Web Support for the Business-to-Business E-Commerce Lifecycle"; WWW2002, Honolulu, Hawaii; May 7-11, 2002; pp. 89-98.
Jaeger, Dirl et al.; "Using UML for Software Process Modeling"; pp. 91-108.
Han, Zaw Z. et al.; "Interoperability from Electronic Commerce to Litigation Using XML Rules"; 2003; pp. 93-94.
Carlson, David A.; "Designing XML Vocabularies with UML"; OOPSLA 2000 Companion; Minneapolis, Minnesota; 2000; pp. 95-96.
Stonebraker, Michael; "Too Much Middleware"; SIGMOD Record; vol. 31, No. 1; Mar. 2002; pp. 97-106.
Maamar, Zakaria et al.; "Toward Intelligent Business Objects"; Communications of the ACM; vol. 43, No. 10; Oct. 2000; pp. 99-101.
Tenenbaum, Jay M. et al.; "Eco System: An Internet Commerce Architecture"; IEEE; May 1997; pp. 48-55.
Eyal, Anat et al.; "Integrating and Customizing Heterogeneous E-Commerce Applications"; The VLDB Journal; Aug. 2001; pp. 16-38.
Office Action issued in related U.S. Appl. No. 11/145,464 on Jan. 22, 2009; 49 pages.
International Search Report and Written Opinion of the International Searching Authority issued in International Application No. PCT/US2007/011378 on Apr. 30, 2008; 17 pages.
International Preliminary Report on Patentability under Chapter I issued in International Application No. PCT/US2007/011378 on Nov. 17, 2008; 11 pages.
International Search Report and Written Opinion of the International Searching Authority issued in International Application No. PCT/IB2006/001401 on Aug. 27, 2008; 8 pages.
International Search Report and Written Opinion of the International Searching Authority issued in International Application No. PCT/US2005/019961 on Sep. 22, 2005; 8 pages.
International Preliminary Report on Patentability under Chapter I issued in International Application No. PCT/US2005/019961 on Dec. 4, 2006; 6 pages.
International Search Report and Written Opinion of the International Searching Authority issued in International Application No. PCT/US2005/021481 on Apr. 11, 2006; 7 pages.
International Search Report and Written Opinion of the International Searching Authority issued in International Application No. PCT/US2005/021481 on May 29, 2007; 6 pages.
International Preliminary Report on Patentability under Chapter I issued in International Application No. PCT/US2005/021481 on Dec. 20, 2006; 6 pages.
International Preliminary Report on Patentability under Chapter I issued in International Application No. PCT/US2005/021481 on Jul. 15, 2008; 5 pages.
International Search Report and Written Opinion of the International Searching Authority issued in International Application No. PCT/US2005/022137 on Sep. 23, 2005; 7 pages.
International Search Report and Written Opinion of the International Searching Authority issued in International Application No. PCT/US2005/022137 on May 12, 2006; 7 pages.
International Preliminary Report on Patentability under Chapter I issued in International Application No. PCT/US2005/022137 on Dec. 28, 2006; 5 pages.
"Header", Newton's Telecom Dictionary; 12th Edition, 2004; pp. 389-390).
Notice of Allowance issued in related U.S. Appl. No. 11/775,821 on Jul. 16, 2010; 4 pages.
Notice of Allowance issued in related U.S. Appl. No. 11/864,832 on Aug. 23, 2010; 4 pages.
Office Action issued in related U.S. Appl. No. 11/864,871 on Apr. 21, 2010; 20 pages.
Advisory Action issued in U.S. Appl. No. 11/155,368 on Mar. 31, 2010; 3 pages.
Office Action issued in related U.S. Appl. No. 12/060,149 on Aug. 26, 2010; 15 pages.
Office Action issued in related U.S. Appl. No. 12/060,178 on May 25, 2010; 19 pages.
Office Action issued in related U.S. Appl. No. 12/060,171 on Jul. 1, 2010; 19 pages.
Baker, Stacy; "Benefits of Assortment Planning"; Assortment Planning for Apparel Retailers—2005 Management Briefing; Just Style; Jun. 2005; 3 pages.
"Visual and Quantitative Assortment Planning Applications Drive Partnership and Profit"; PR Newswire; Jan. 12, 2006; 3 pages.
"DOTS Inc. Selects Compass Software's smartmerchandising for Merchandise Planning and Assortment Planning"; PR Newswire; Dec. 11, 2002; 2 pages.
Annevelink et al.; "Heterogeneous Database Intergration in a Physician Workstation"; 1992; 5 pages.
Ketabchi et al.; "Object-Oriented Database Management Support for Software Maintenance and Reverse Engineering"; Department of Electrical Engineering and Computer Science, Santa Clara University; 1989; 4 pages.
International Search Report and Written Opinion of the International Searching Authority issued in International Application No. PCT/CN2010/073856 on Mar. 17, 2011; 8 pages.
International Search Report and Written Opinion of the International Searching Authority issued in International Application No. PCT/CN2010/073864 on Mar. 3, 2011; 8 pages.

(56) References Cited

OTHER PUBLICATIONS

International Search Report and Written Opinion of the International Searching Authority issued in International Application No. PCT/CN2010/073868 on Mar. 17, 2011; 10 pages.
Communication Pursuant to Rules 70(2) and 70a(2) EPC issued in related European Application No. 07835755.5 on Feb. 28, 2011; 6 pages.
Communication Pursuant to Article 94(3) issued in European Application No. 05757432.9 on Apr. 12, 2011; 5 pages.
Notice of Allowance issued in related U.S. Appl. No. 12/147,395 on Oct. 26, 2010; 10 pages.
Notice of Allowance issued in U.S. Appl. No. 12/147,395 on May 4, 2011; 10 pages.
Notice of Allowance issued in related U.S. Appl. No. 12/147,449 on Apr. 28, 2011; 9 pages.
Office Action issued in related U.S. Appl. No. 12/147,399 on Jan. 26, 2011; 16 pages.
Office Action issued in related U.S. Appl. No. 12/334,175 on May 27, 2011; 12 pages.
Notice of Allowance issued in related U.S. Appl. No. 11/731,857 on Nov. 29, 2010; 4 pages.
Notice of Allowance issued in related U.S. Appl. No. 11/731,857 on Apr. 11, 2011; 8 pages.
Office Action issued in related U.S. Appl. No. 11/864,871 on Oct. 1, 2010; 30 pages.
Office Action issued in U.S. Appl. No. 12/147,414 on Apr. 14, 2011; 30 pages.
Office Action issued in U.S. Appl. No. 12/147,378 on Jun. 17, 2011; 10 pages.
Notice of Allowance issued in U.S. Appl. No. 12/323,139 on Mar. 4, 2011; 13 pages.
Office Action issued in related U.S. Appl. No. 12/059,971 on Nov. 4, 2010; 20 pages.
Office Action issued in related U.S. Appl. No. 12/059,971 on May 18, 2011; 13 pages.
Office Action issued in related U.S. Appl. No. 12/060,054 on Jun. 29, 2011; 15 pages.
Office Action issued in U.S. Appl. No. 12/060,144 on Jun. 23, 2011; 16 pages.
Office Action issued in related U.S. Appl. No. 12/059,804 on Apr. 28, 2011; 14 pages.
Office Action issued in related U.S. Appl. No. 12/060,149 on Feb. 4, 2011; 19 pages.
Office Action issued in related U.S. Appl. No. 12/060,192 on Apr. 14, 2011; 18 pages.
Notice of Allowance issued in related U.S. Appl. No. 12/060,178 on Dec. 6, 2010; 4 pages.
Office Action issued in related U.S. Appl. No. 12/060,062 on Jul. 13, 2011; 16 pages.
Office Action issued in related U.S. Appl. No. 12/060,155 on May 10, 2011; 8 pages.
Office Action issued in related U.S. Appl. No. 12/060,171 on Jan. 26, 2011; 17 pages.
Notice of Allowance issued in related U.S. Appl. No. 11/145,464 on Nov. 1, 2010; 4 pages.
Notice of Allowance issued in related U.S. Appl. No. 11/145,464 on Feb. 23, 2011; 7 pages.
Notice of Allowance issued in U.S. Appl. No. 11/155,368 on Oct. 7, 2010; 4 pages.
Notice of Allowance issued in U.S. Appl. No. 11/155,368 on Mar. 14, 2011; 7 pages.
Notice of Allowance issued in related U.S. Appl. No. 11/166,065 on Sep. 20, 2010; 6 pages.
Notice of Allowance issued in U.S. Appl. No. 11/166,065 on Mar. 8, 2011; 5 pages.
Office Action issued in related U.S. Appl. No. 11/864,866 on Feb. 3, 2011; 20 pages.
Notice of Allowance issued in related U.S. Appl. No. 11/864,866 on Jul. 22, 2011; 6 pages.
Notice of Allowance issued in related U.S. Appl. No. 11/775,821 on Oct. 22, 2010; 4 pages.
Notice of Allowance issued in related U.S. Appl. No. 11/775,821 on Feb. 4, 2011; 4 pages.
Notice of Allowance issued in related U.S. Appl. No. 11/364,538 on Dec. 13, 2010; 5 pages.
Notice of Allowance issued in related U.S. Appl. No. 11/364,538 on Jul. 26, 2011; 6 pages.
Office Action issued in U.S. Appl. No. 11/864,811 on Mar. 18, 2011; 10 pages.
Office Action issued in U.S. Appl. No. 11/864,811 on Jul. 26, 2011; 7 pages.
Notice of Allowance issued in related U.S. Appl. No. 11/864,832 on Dec. 3, 2010; 9 pages.
Notice of Allowance issued in related U.S. Appl. No. 11/864,832 on Jul. 7, 2011;11 pages.
Office Action issued in related U.S. Appl. No. 11/864,863 on Jul. 21, 2011; 29 pages.
Notice of Allowance issued in related U.S. Appl. No. 11/803,178 on May 17, 2011; 13 pages.
Communication Pursuant to Article 94(3) issued in European Application No. 05766672.9 on Jul. 14, 2011; 4 pages.
Office Action issued in U.S. Appl. No. 12/147,414 on Oct. 26, 2011; 27 pages.
Notice of Allowance issued in U.S. Appl. No. 12/147,378 on Nov. 9, 2011; 16 pages.
Office Action issued in U.S. Appl. No. 12/323,116 on Sep. 6, 2011; 8 pages.
Office Action issued in U.S. Appl. No. 12/571,140 on Sep. 26, 2011; 14 pages.
Office Action issued in related U.S. Appl. No. 12/060,054 on Dec. 7, 2011; 15 pages.
Office Action issued in U.S. Appl. No. 12/060,144 on Dec. 8, 2011; 18 pages.
Office Action issued in U.S. Appl. No. 12/059,804 on Nov. 14, 2011; 15 pages.
Office Action issued in related U.S. Appl. No. 12/059,860 on Aug. 3, 2011; 15 pages.
Office Action issued in related U.S. Appl. No. 12/060,192 on Sep. 6, 2011; 18 pages.
Notice of Allowance issued in related U.S. Appl. No. 12/060,178 on Sep. 2, 2011; 9 pages.
Office Action issued in related U.S. Appl. No. 12/060,155 on Oct. 31, 2011; 15 pages.
Notice of Allowance issued in U.S. Appl. No. 11/155,368 on Nov. 8, 2011; 7 pages.
Notice of Allowance issued in U.S. Appl. No. 11/775,821 on Sep. 21, 2011; 5 pages.
Notice of Allowance issued in U.S. Appl. No. 11/864,811 on Nov. 14, 2011; 8 pages.
Lockemann et al.; "Flexibility through Multi-Agent Systems: Solutions or Illusions"; SOFSEM 2004; pp. 41-56.
Mascolo et al.; "An Analytical Method for Performance Evaluation of Kanban Controlled Production Systems"; Operations Research; vol. 44, No. 1; 1996; pp. 50-64.
Altintas et al.; "Aurora Software Product Line"; Cybersoft Information Technologies Co.; 2005; pp. 1-8.
Himoff et al.; "MAGENTA Technology: Multi-Agent Systems for Industrial Logistics"; AAMAS'05; Jul. 25-29, 2005; 2005 ACM; pp. 60-66:1-7).
Gable, Julie; "Enterprise Application Integration"; Information Management Journal; Mar./Apr. 2002; pp. 48-52.
"SAP Labs and HP Team to Advance Internet-Based Supply Chain Collaboration"; Business Editors and Technology Writers; Business Wire; New York; Feb. 3, 2000; 4 pages.
Shi, Min-Hua et al.; "MQML—Message Queuing Markup Language"; Proceedings of the 4th IEEE International Workshop on Advanced Issues of E-Commerce and Web-Based Information Systems (WECWIS 2002); 2002; 8 pages.
Boetterweck, Goetz; "A Model-Driven Approach to the Engineering of Multiple User Interfaces"; Lecture Notes in Computer Science; 2007; vol. 4364/2007; pp. 106-115.
SAP 2008 Annual Report; 256 pages.

(56) References Cited

OTHER PUBLICATIONS

International Search Report and Written Opinion issued in International Application No. PCT/CN2011/001238 on May 3, 2012; 9 pages.
Communication Pursuant to Article 94(3) EPC issued in European Application No. 07835755.5 on Feb. 22, 2012; 7 pages.
Office Action issued in U.S. Appl. No. 13/349,477 on Jun. 29, 2012; 13 pages.
Notice of Allowance issued in related U.S. Appl. No. 11/731,857 on Dec. 14, 2011; 7 pages.
Office Action issued in U.S. Appl. No. 12/323,116 on Jan. 27, 2012; 7 pages.
Notice of Allowance issued in U.S. Appl. No. 12/323,116 on Jun. 11, 2012; 10 pages.
Notice of Allowance issued in U.S. Appl. No. 12/323,139 on Mar. 14, 2012; 10 pages.
Notice of Allowance issued in U.S. Appl. No. 12/571,140 on Mar. 20, 2012; 16 pages.
Office Action issued in U.S. Appl. No. 12/571,154 on Apr. 2, 2012; 13 pages.
Notice of Allowance issued in U.S. Appl. No. 12/059,971 on Jun. 28, 2012; 12 pages.
Office Action issued in related U.S. Appl. No. 12/059,860 on Jan. 23, 2012; 16 pages.
Notice of Allowance issued in U.S. Appl. No. 12/060,192 on Mar. 2, 2012; 18 pages.
Notice of Allowance issued in U.S. Appl. No. 12/060,062 on Mar. 20, 2012; 16 pages.
Notice of Allowance issued in U.S. Appl. No. 12/060,155 on Apr. 24, 2012; 15 pages.
Office Action issued in related U.S. Appl. No. 12/060,171 on Mar. 1, 2012; 19 pages.
Notice of Allowance issued in related U.S. Appl. No. 11/145,464 on Feb. 6, 2012; 7 pages.
Notice of Allowance issued in U.S. Appl. No. 11/166,065 on Feb. 15, 2012; 7 pages.
Office Action issued in U.S. Appl. No. 12/815,698 on Jan. 20, 2012; 10 pages.
Office Action issued in U.S. Appl. No. 12/815,698 on Jul. 20, 2012; 13 pages.
Office Action issued in U.S. Appl. No. 12/815,802 on Jul. 20, 2012; 16 pages.
Office Action issued in U.S. Appl. No. 12/815,618 on Dec. 22, 2011; 8 pages.
Notice of Allowance issued in U.S. Appl. No. 12/815,618 on May 10, 2012; 7 pages.
Office Action issued in U.S. Appl. No. 12/816,083 on May 9, 2012; 20 pages.
Office Action issued in U.S. Appl. No. 12/815,639 on May 24, 2012; 7 pages.
Office Action issued in U.S. Appl. No. 12/816,293 on Apr. 25, 2012; 10 pages.
Office Action issued in U.S. Appl. No. 12/816,170 on Jul. 24, 2012; 9 pages.
Notice of Allowance issued in related U.S. Appl. No. 11/864,866 on Mar. 13, 2012; 7 pages.
Notice of Allowance issued in U.S. Appl. No. 11/775,821 on Dec. 30, 2011; 5 pages.
Notice of Allowance issued in related U.S. Appl. No. 11/364,538 on Jul. 13, 2012; 7 pages.
Notice of Allowance issued in U.S. Appl. No. 11/864,811 on Mar. 2, 2012; 8 pages.
Office Action issued in U.S. Appl. No. 11/864,786 on Mar. 30, 2012; 12 pages.
Notice of Allowance issued in related U.S. Appl. No. 11/864,832 on Jan. 9, 2012; 12 pages.
Notice of Allowance issued in related U.S. Appl. No. 11/864,832 on Jul. 30, 2012; 12 pages.
Office Action issued in related U.S. Appl. No. 11/864,863 on Dec. 22, 2011; 20 pages.
Office Action issued in U.S. Appl. No. 13/192,555 on Jul. 20, 2012; 7 pages.

* cited by examiner

FIG. 27E
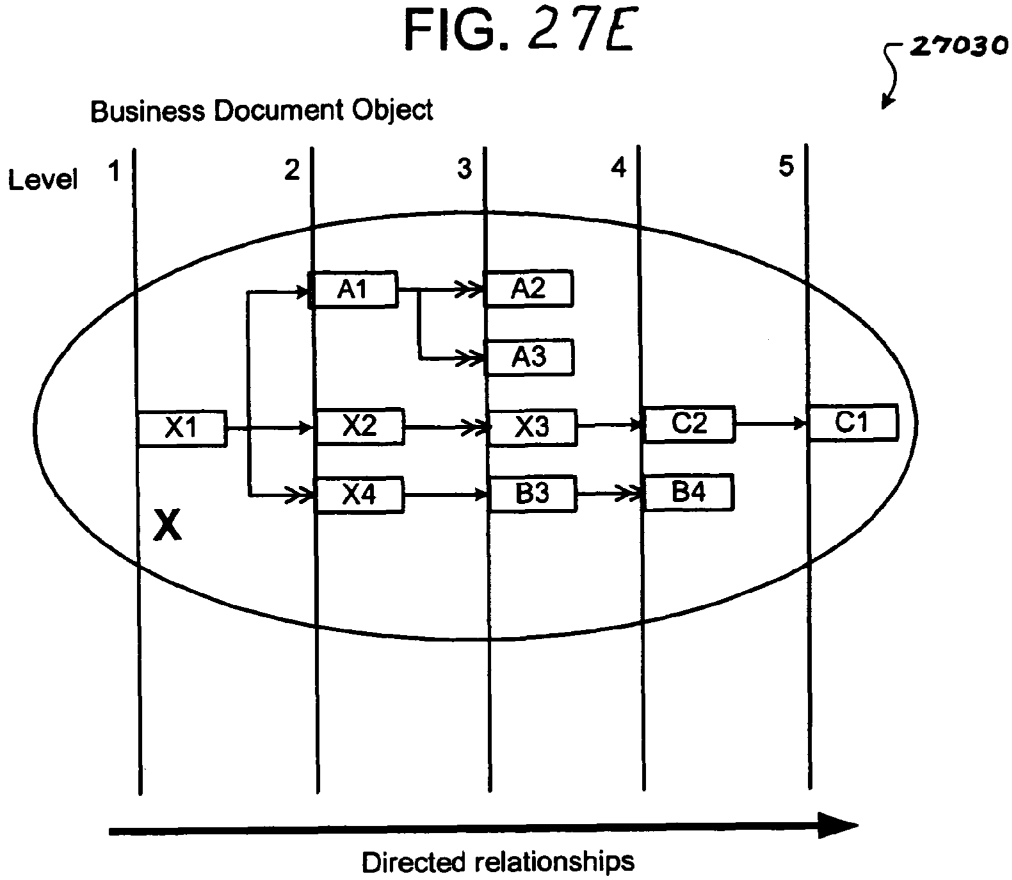
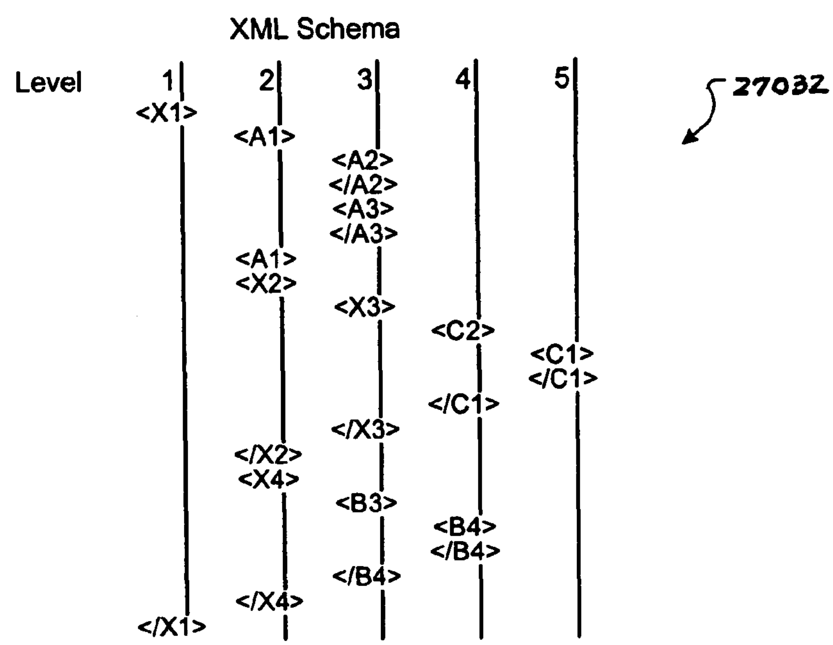

FIG. 31-1

| Package | level 1 | level 2 | level 3 | level 4 | Cardinality | Datatype Name |
|---|---|---|---|---|---|---|
| AdvertisingIssue SimpleByElements QueryMessage_sync 31000 | Advertising Issue SimpleBy Element-sQuery_sync 31002 | | | | | <Message-DataType> 31004 |
| MessageHeader 31006 | | Message Header 31008 | | | 0..1 31010 | BasicBusiness-DocumentMes-sageHeader 31012 |
| Selection 31014 | | AdvertisingIssue-SimpleSelection-ByElements 31016 | | | 1 31018 | |
| | | | Selection ByAd-vertising Bookin-gUnitID 31020 | | 0..N 31022 | |
| | | | | Inclusion-Exclu-sionCode 31024 | 1 31026 | InclusionExclu-sionCode 31028 |

FIG. 31-2

| Package | level 1 | level 2 | level 3 | level 4 | Cardinality | Datatype Name |
|---|---|---|---|---|---|---|
| | | | | Interval-Bound-aryType-Code 31030 | 1 31032 | IntervalBound-aryTypeCode 31034 |
| | | | | Lower-Boundary-Advertis-ingBookin-gUnitID 31036 | 1 31038 | AdvertisingBook-ingUnitID 31040 |
| | | | | Upper-Boundary-Advertis-ingBookin-gUnitID 31042 | 0..1 31044 | AdvertisingBook-ingUnitID 31046 |
| | | | SelectionBy Pro-ductionUnit Ad-vertisingContent ComponentID 31048 | | 0..N 31050 | |

FIG. 31-3

| Package | level 1 | level 2 | level 3 | level 4 | Cardinality | Datatype Name |
|---|---|---|---|---|---|---|
| | | | | InclusionExclusionCode 31052 | 1 31054 | InclusionExclusionCode 31056 |
| | | | | IntervalBoundaryTypeCode 31058 | 1 31060 | IntervalBoundaryTypeCode 31062 |
| | | | | LowerBoundaryProductionUnitAdvertisingContentComponentID 31064 | 1 31066 | AdvertisingContentComponentID 31068 |

FIG. 31-4

| Package | level 1 | level 2 | level 3 | level 4 | Cardinality | Datatype Name |
|---|---|---|---|---|---|---|
| | | | | UpperBoundaryProductionUnitAdvertisingContentComponentID 31070 | 0..1 31072 | AdvertisingContentComponentID 31074 |
| | | | SelectionByAdvertisingBookingUnitAdvertisingMultiRunCode 31076 | | 0..N 31078 | |
| | | | | InclusionExclusionCode 31080 | 1 31082 | InclusionExclusionCode 31084 |
| | | | | IntervalBoundaryTypeCode 31086 | 1 31088 | IntervalBoundaryTypeCode 31090 |

FIG. 31-5

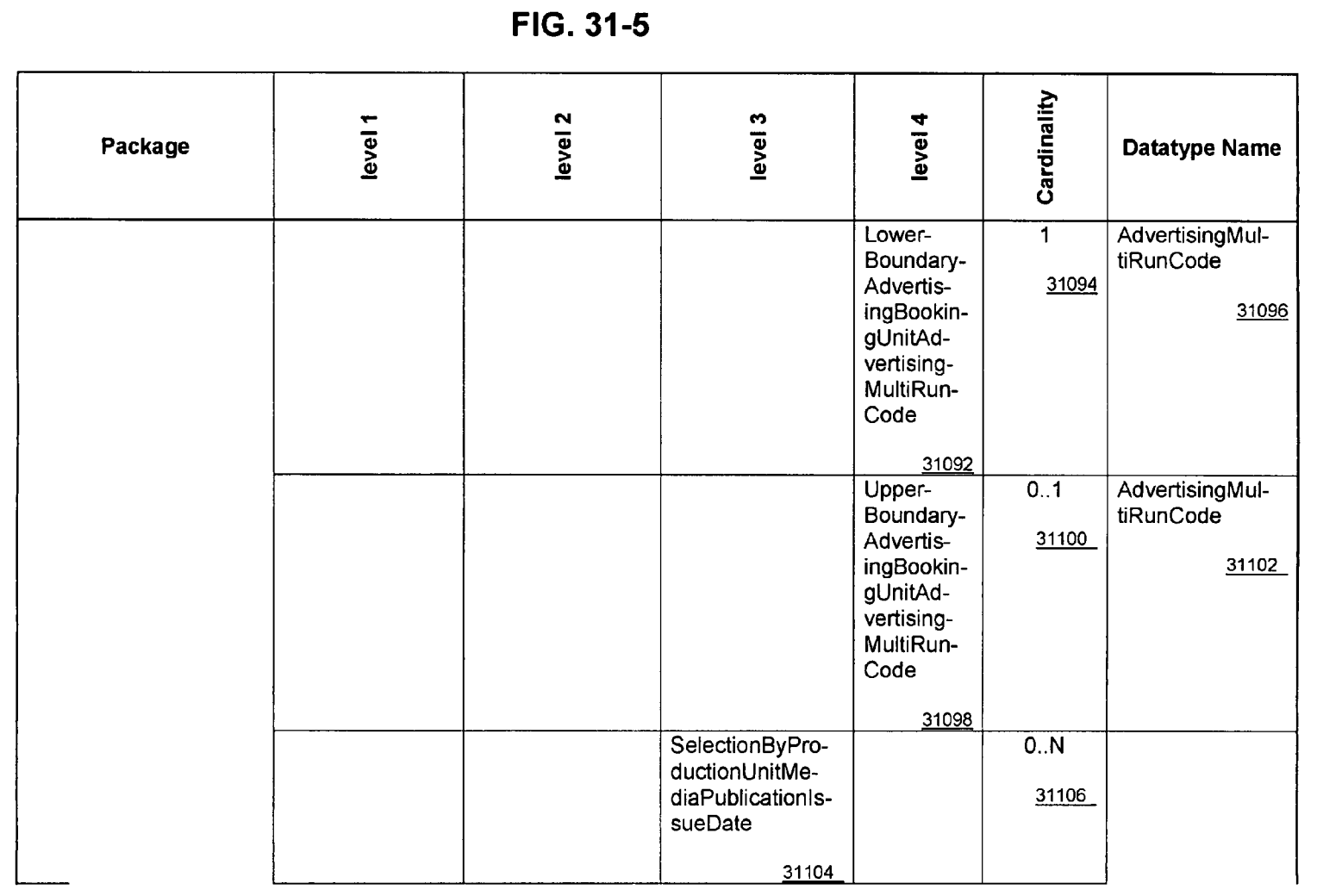

| Package | level 1 | level 2 | level 3 | level 4 | Cardinality | Datatype Name |
|---|---|---|---|---|---|---|
| | | | | LowerBoundaryAdvertisingBookingUnitAdvertisingMultiRunCode 31092 | 1 31094 | AdvertisingMultiRunCode 31096 |
| | | | | UpperBoundaryAdvertisingBookingUnitAdvertisingMultiRunCode 31098 | 0..1 31100 | AdvertisingMultiRunCode 31102 |
| | | | SelectionByProductionUnitMediaPublicationIssueDate 31104 | | 0..N 31106 | |

FIG. 31-6

| Package | level 1 | level 2 | level 3 | level 4 | Cardinality | Datatype Name |
|---|---|---|---|---|---|---|
| | | | | Inclusion-Exclu-sionCode 31108 | 1 31110 | InclusionExclu-sionCode 31112 |
| | | | | Interval-Bound-aryType-Code 31114 | 1 31116 | IntervalBound-aryTypeCode 31118 |
| | | | | Lower-Bound-aryProduc-tionUnit-MediaPub-licationIs-sueDate 31120 | 1 31122 | MediaPublica-tion.IssueDate 31124 |

FIG. 31-7

| Package | level 1 | level 2 | level 3 | level 4 | Cardinality | Datatype Name |
|---|---|---|---|---|---|---|
| | | | | UpperBoundaryProductionUnitMediaPublicationIssueDate 31126 | 0..1 31128 | MediaPublication.IssueDate 31130 |
| | | | SelectionByProductionUnitMediaPublicationIssueID 31132 | | 0..N 31134 | |
| | | | | InclusionExclusionCode 31136 | 1 31138 | InclusionExclusionCode 31140 |
| | | | | IntervalBoundaryTypeCode 31142 | 1 31144 | IntervalBoundaryTypeCode 31146 |

FIG. 31-8

| Package | level 1 | level 2 | level 3 | level 4 | Cardinality | Datatype Name |
|---|---|---|---|---|---|---|
| | | | | Lower-BoundaryProductionUnit-MediaPublicationIssueID 31148 | 1 31150 | MediaPublicationIssueID 31152 |
| | | | | Upper-BoundaryProductionUnit-MediaPublicationIssueID 31154 | 0..1 31156 | MediaPublicationIssueID 31158 |
| Processing Conditions 31160 | | Processing Conditions 31162 | | | 1 31164 | |
| | | | QueryHitsMaximumNumberValue 31166 | | 0..1 31168 | QueryHits.Maximum.NumberValue 31170 |

FIG. 31-9

| Package | level 1 | level 2 | level 3 | level 4 | Cardinality | Datatype Name |
|---|---|---|---|---|---|---|
| | | | UnlimitedQuery-HitsIndicator 31172 | | 0..1 31174 | UnlimitedQuery-Hits.Indicator 31176 |

FIG. 32-1

| Package | level 1 | level 2 | level 3 | level 4 | level 5 | Cardinality | Datatype Name |
|---|---|---|---|---|---|---|---|
| AdvertisingIssue Simple-ByElements ResponseMessage _sync 32000 | AdvertisingIssue Simple ByElements Response_sync 32002 | | | | | | AdvertisingIssueSimple ByElements Response_sync 32004 |
| Message Header 32006 | | Message Header 32008 | | | | 0..1 32010 | BasicBusiness Document MessageHeader 32012 |
| Advertising Issue 32014 | | Advertising Issue 32016 | | | | 0..n 32018 | |
| | | | ID 32020 | | | 1 32022 | Advertising IssueID 32024 |
| | | | Advertising BookingUnit 32026 | | | 1 32028 | |

FIG. 32-2

| Package | level 1 | level 2 | level 3 | level 4 | level 5 | Cardinality | Datatype Name |
|---|---|---|---|---|---|---|---|
| | | | | ID 32030 | | 1 32032 | Advertising-BookingUnitID 32034 |
| | | | | Name 32036 | | 1 32038 | Advertising-Bookin-gUnit.Name 32040 |
| | | | | MultiRun 32042 | | 0..1 32044 | |
| | | | | | Advertis-ing Issue GroupID 32046 | 1 32048 | MultiRunAdver-tisingIssue-GroupID 32050 |
| | | | | | Advertis-ing Mul-tiRun-Code 32052 | 1 32054 | AdvertisingMul-tiRunCode 32056 |

FIG. 32-3

| Package | level 1 | level 2 | level 3 | level 4 | level 5 | Cardinality | Datatype Name |
|---|---|---|---|---|---|---|---|
| | | | | | Advertis-ing Mul-tiRun-Name 32058 | 1 32060 | AdvertisingMul-tiRun.Name 32062 |
| | | | Production Unit 32064 | | | 1 32066 | |
| | | | | Advertising-BookingUnitID 32068 | | 1 32070 | Advertising-BookingUnitID 32072 |
| | | | | AdvertisingCon-tentComponen-tID 32074 | | 1 32076 | AdvertisingCon-tent Componen-tID 32078 |
| | | | | MediaPublica-tion IssueID 32080 | | 0..1 32082 | MediaPublica-tionIssueID 32084 |
| | | | | MediaPublica-tionIssueDate 32086 | | 1 32088 | MediaPublica-tion.IssueDate 32090 |

FIG. 32-4

| Package | level 1 | level 2 | level 3 | level 4 | level 5 | Cardinality | Datatype Name |
|---|---|---|---|---|---|---|---|
| | | | | Advertising-BookingUnit-Name 32092 | | 1 32094 | Advertising Booking Unit.Name 32096 |
| | | | | AdvertisingCon-tentCompo-nentName 32098 | | 1 32100 | Advertising Content Component. Name 32102 |
| Processing Conditions 32104 | | Processing Conditions 32106 | | | | 1 32108 | |
| | | | Returned QueryHits NumberValue 32110 | | | 1 32112 | ReturnedQuery-Hits.NumberVal ue 32114 |
| | | | More Elements Available Indicator 32116 | | | 1 32118 | MoreElements Avail-able.Indicator 32120 |

FIG. 32-5

| Package | level 1 | level 2 | level 3 | level 4 | level 5 | Cardinality | Datatype Name |
|---|---|---|---|---|---|---|---|
| Log 32122 | | Log 32124 | | | | 1 32126 | Log 32128 |

FIG. 46

| Package | level 1 | level 2 | level 3 | Cardinality | Datatype Name |
|---|---|---|---|---|---|
| Appropriation RequestApprove Confirmation Message_sync 46000 | AppropriationRequest Approve-Confirmation Message 46002 | | | | AppropriationRequestApprove RequestMessage_sync 46004 |
| AppropriationRequest 46006 | | Appropriation Request 46008 | | 0..1 46010 | AppropriationRequest 46012 |
| | | | ID 46014 | 1 46016 | AppropriationRequestID 46018 |
| Log 46020 | | Log 46022 | | 1 46024 | Log 46026 |

FIG. 47

| Package | level 1 | level 2 | level 3 | Cardinality | Datatype Name |
|---|---|---|---|---|---|
| Appropriation RequestApprove RequestMessage_sync 47000 | Appropriation RequestApprove RequestMessage_sync 47002 | | | | Appropriation RequestApprove RequestMessage_sync 47004 |
| AppropriationRequest 47006 | | Appropriation Request 47008 | | 1 47010 | AppropriationRequest 47012 |
| | | | ID 47014 | 1 47016 | AppropriationRequestID 47018 |

FIG. 48

| Package | level 1 | level 2 | level 3 | Cardinality | Datatype Name |
|---|---|---|---|---|---|
| Appropriation RequestByID Query Message_sync 48000 | Appropriation RequestByID Query Message_sync 48002 | | | | Appropriation RequestByID Query Message_sync 48004 |
| Selection 48006 | | Appropriation Request SelectionByID 48008 | | 1 48010 | Appropriation Request SelectionByID 48012 |
| | | | Appropriation RequestID 48014 | 1 48016 | Appropriation RequestID 48018 |

FIG. 49-1

| Package | level 1 | level 2 | level 3 | level 4 | level 5 | Cardinality | Datatype Name |
|---|---|---|---|---|---|---|---|
| AppropriationRequest ByIDResponse Message_sync 49000 | Appropriation RequestByID Response Message_sync 49002 | | | | | | Appropriation-RequestBy-IDResponse-Message_sync 49004 |
| AppropriationRequest 49006 | | Appropriation Request 49008 | | | | 0..1 49010 | Appropriation-Request 49012 |
| | | | ID 49014 | | | 1 49016 | Appropriation-RequestID 49018 |
| | | | TypeCode 49020 | | | 1 49022 | Appropriation-RequestType-Code 49024 |
| | | | TypeName 49026 | | | 0..1 49028 | LONG_Name 49030 |

FIG. 49-2

| Package | level 1 | level 2 | level 3 | level 4 | level 5 | Cardinality | Datatype Name |
|---|---|---|---|---|---|---|---|
| | | | Pro-grammeDe finitionID 49032 | | | 1 49034 | ProgrammeDefi-nitionID 49036 |
| | | | Approval-Fiscal YearID 49038 | | | 1 49040 | FiscalYearID 49042 |
| | | | Program-meID 49044 | | | 1 49046 | ProgrammeID 49048 |
| | | | PlannedIm plementa-tion Start-Date 49050 | | | 0..1 49052 | Date 49054 |
| | | | Investmen-tReason Code 49056 | | | 0..1 49058 | Investment Rea-sonCode 49060 |

FIG. 49-3

| Package | level 1 | level 2 | level 3 | level 4 | level 5 | Cardinality | Datatype Name |
|---|---|---|---|---|---|---|---|
| | | | Investment-tReason Name 49062 | | | 0..1 49064 | LONG_Name 49066 |
| | | | Environ-mentIn-vestment Purpose-Code 49068 | | | 0..1 49070 | Environment In-vestmentPur-poseCode 49072 |
| | | | Environ-mentIn-vestment Pur-poseName 49074 | | | 0..1 49076 | LONG_Name 49078 |
| | | | Invest-mentCoun-try Code 49080 | | | 0..1 49082 | CountryCode 49084 |
| | | | Invest-mentCoun-try Name 49086 | | | 0..1 49088 | MEDIUM_Name 49090 |

FIG. 49-4

| Package | level 1 | level 2 | level 3 | level 4 | level 5 | Cardinality | Datatype Name |
|---|---|---|---|---|---|---|---|
| | | | Priority-Code 49092 | | | 0..1 49094 | PriorityCode 49096 |
| | | | Priority-Name 49098 | | | 0..1 49100 | MEDIUM_Name 49102 |
| | | | Invest-mentScale Code 49104 | | | 0..1 49106 | Invest-mentScaleCode 49108 |
| | | | Invest-mentSca-leName 49110 | | | 0..1 49112 | LONG_Name 49114 |
| | | | Approval-Status-Code 49116 | | | 1 49118 | ApprovalStatus-Code 49120 |
| | | | Approval-Status-Name 49122 | | | 1 49124 | MEDIUM_Name 49126 |

FIG. 49-5

| Package | level 1 | level 2 | level 3 | level 4 | level 5 | Cardinality | Datatype Name |
|---|---|---|---|---|---|---|---|
| | | | Description 49128 | | | 0..1 49130 | MEDIUM_Description 49132 |
| | | | Text 49134 | | | 0..1 49136 | Text 49138 |
| Party 49140 | | | InvestmentRecipientParty 49142 | | | 0..n 49144 | Party 49146 |
| | | | | ID 49148 | | 1 49150 | PartyID 49152 |
| | | | | Name 49154 | | 0..1 49156 | LONG_Name 49158 |
| | | | | TypeCode 49160 | | 1 49162 | BusinessObjectTypeCode 49164 |
| | | | | TypeName 49166 | | 1 49168 | LANGUAGEINDEPENDENT_EXTENDED_Name 49170 |

FIG. 49-6

| Package | level 1 | level 2 | level 3 | level 4 | level 5 | Cardinality | Datatype Name |
|---|---|---|---|---|---|---|---|
| | | | ProcessorParty 49172 | | | 0..n 49174 | Party 49176 |
| | | | | ID 49178 | | 1 49180 | PartyID 49182 |
| | | | | Name 49184 | | 0..1 49186 | LONG_Name 49188 |
| | | | | TypeCode 49190 | | 1 49192 | BusinessObjectTypeCode 49194 |
| | | | | TypeName 49196 | | 1 49198 | LANGUAGEINDEPENDENT_EXTENDED_Name 49200 |
| | | | RequestorParty 49202 | | | 0..n 49204 | Party 49206 |
| | | | | InternalID 49208 | | 1 49210 | PartyInternalID 49212 |
| | | | | Name 49214 | | 0..1 49216 | LONG_Name 49218 |

FIG. 49-7

| Package | level 1 | level 2 | level 3 | level 4 | level 5 | Cardinality | Datatype Name |
|---|---|---|---|---|---|---|---|
| | | | | TypeCode 49220 | | 1 49222 | BusinessObjectTypeCode 49224 |
| | | | | TypeName 49226 | | 1 49228 | LANGUAGEINDEPENDENT_EXTENDED_Name 49230 |
| | | | EmployeeResponsibleParty 49232 | | | 0..n 49234 | Party 49236 |
| | | | | InternalID 49238 | | 1 49240 | PartyInternalID 49242 |
| | | | | Name 49244 | | 0..1 49246 | LONG_Name 49248 |
| | | | | TypeCode 49250 | | 1 49252 | BusinessObjectTypeCode 49254 |

FIG. 49-8

| Package | level 1 | level 2 | level 3 | level 4 | level 5 | Cardinality | Datatype Name |
|---|---|---|---|---|---|---|---|
| | | | | TypeName 49256 | | 1 49258 | LANGUAGEINDEPENDENT_EXTENDED_Name 49260 |
| | | | ApproverParty 49262 | | | 0..n 49264 | Party 49266 |
| | | | | InternalID 49268 | | 1 49270 | PartyInternalID 49272 |
| | | | | Name 49274 | | 0..1 49276 | LONG_Name 49278 |
| | | | | TypeCode 49280 | | 1 49282 | BusinessObjectTypeCode 49284 |
| | | | | TypeName 49286 | | 1 49288 | LANGUAGEINDEPENDENT_EXTENDED_Name 49290 |
| Variant 49292 | | | Variant 49294 | | | 1..n 49296 | Variant 49298 |

FIG. 49-9

| Package | level 1 | level 2 | level 3 | level 4 | level 5 | Cardinality | Datatype Name |
|---|---|---|---|---|---|---|---|
| | | | | ID 49300 | | 1 49302 | Appropriation-RequestVartian-tID 49304 |
| | | | | Description 49306 | | 0..1 49308 | MEDIUM_Description 49310 |
| | | | | Appropria-tionRe-questVari-ant As-sesment-Code 49312 | | 0..1 49314 | Appropriation-RequestVarian-tAssesmentCode 49316 |
| | | | | Appropria-tionRe-questVari-ant As-sesment-Name 49318 | | 0..1 49320 | LONG_Name 49322 |
| Plan-ning Version | | | | Planning Version 49326 | | 0..n 49328 | PlanningVersion 49330 |

FIG. 49-10

| Package | level 1 | level 2 | level 3 | level 4 | level 5 | Cardinality | Datatype Name |
|---|---|---|---|---|---|---|---|
| 49324 | | | | | Accounting Planning VersionCode 49332 | 1 49334 | AccountingPlanningVersionCode 49336 |
| | | | | | Accounting-Planning-Version-Name 49338 | 0..1 49340 | LONG_Name 49342 |
| Plan Values 49344 | | | | PlanValues 49346 | | 0..n 49348 | PlanValues 49350 |
| | | | | | FiscalYearDependencyIndicator 49352 | 0..1 49354 | Indicator 49356 |
| | | | | | FiscalYearID 49358 | 0..1 49360 | FiscalYearID 49362 |
| | | | | | InvestmentAmount 49364 | 0..1 49366 | Amount 49368 |

FIG. 49-11

| Package | level 1 | level 2 | level 3 | level 4 | level 5 | Cardinality | Datatype Name |
|---|---|---|---|---|---|---|---|
| | | | | | Over-headAmount 49370 | 0..1 49372 | Amount 49374 |
| | | | | | RevenueA-mount 49376 | 0..1 49378 | Amount 49380 |
| Prein-vest ment Analysis 49382 | | | | Preinvest-mentAna-lysis 49384 | | 0..1 49386 | Preinvestmen-tAnalysis 49388 |
| | | | | | Discoun-tReference-Date 49390 | 1 49392 | Date 49394 |
| | | | | | NetPresent-ValueA-mount 49396 | 1 49398 | Amount 49400 |
| | | | | | Internal-RateOfRe-turnPercent 49402 | 0..1 49404 | Percent 49406 |

FIG. 49-12

| Package | level 1 | level 2 | level 3 | level 4 | level 5 | Cardinality | Datatype Name |
|---|---|---|---|---|---|---|---|
| | | | | | PaybackPe-riodDuration 49408 | 0..1 49410 | YEAR_Duration 49412 |
| | | | | | Discounted-Cash-FlowRatio 49414 | 0..1 49416 | Ratio 49418 |
| Log 49420 | | Log 49422 | | | | 1 49424 | Log 49426 |

FIG. 50

| Package | level 1 | level 2 | level 3 | Cardinality | Datatype Name |
|---|---|---|---|---|---|
| Appropriation Request Postpone Confirmation Message_sync 50000 | Appropriation RequestPostpone Confirmation Message_sync 50002 | | | | AppropriationRequestPostpone RequestMessage_sync 50004 |
| AppropriationRequest 50006 | | Appropriation Request 50008 | | 0..1 50010 | AppropriationRequest 50012 |
| | | | ID 50014 | 1 50016 | AppropriationRequestID 50018 |
| Log 50020 | | Log 50022 | | 1 50024 | Log 50026 |

FIG. 51

| Package | level 1 | level 2 | level 3 | Cardinality | Datatype Name |
|---|---|---|---|---|---|
| AppropriationRequest PostponeRequest Message_sync 51000 | AppropriationRequest PostponeRequest Message_sync 51002 | | | | AppropriationRequest PostponeRequest Message_sync 51004 |
| AppropriationRequest 51006 | | Appropriation Request 51008 | | 1 51010 | AppropriationRequest 51012 |
| | | | ID 51014 | 1 51016 | AppropriationRequestID 51018 |

FIG. 52

| Package | level 1 | level 2 | level 3 | Cardinality | Datatype Name |
|---|---|---|---|---|---|
| AppropriationRequest RejectConfirmation Message_sync 52000 | AppropriationRequest RejectConfirmation Message_sync 52002 | | | | AppropriationRequest RejectRequest Message_sync 52004 |
| Appropriation Request 52006 | | Appropriation Request 52008 | | 0..1 52010 | AppropriationRequest 52012 |
| | | | ID 52014 | 1 52016 | AppropriationRequestID 52018 |
| Log 52020 | | Log 52022 | | 1 52024 | Log 52026 |

FIG. 53

| Package | level 1 | level 2 | level 3 | Cardinality | Datatype Name |
|---|---|---|---|---|---|
| AppropriationRequest RejectRequest Message_sync 53000 | AppropriationRequest RejectRequest Message_sync 53002 | | | | AppropriationRequest RejectRequest Message_sync 53004 |
| AppropriationRequest 53006 | | Appropriation Request 53008 | | 1 53010 | AppropriationRequest 53012 |
| | | | ID 53014 | 1 53016 | AppropriationRequestID 53018 |

FIG. 54

| Package | level 1 | level 2 | level 3 | Cardinality | Datatype Name |
|---|---|---|---|---|---|
| AppropriationRequestVariantByApproverAndInApprovalStatusQueryMessage_sync 54000 | AppropriationRequestVariantByApproverAndInApprovalStatusQueryMessage_sync 54002 | | | | AppropriationRequestVariantByApproverAndInApprovalStatusQueryMessage_sync 54004 |
| Selection 54006 | | Appropriation RequestVariant SelectionBy ApproverAndIn ApprovalStatus 54008 | | 1 54010 | AppropriationRequesVariantSelectionByApproverAndInApprovalStatus 54012 |
| | | | Party Internal ID 54014 | 1 54016 | PartyInternalID 54018 |

FIG. 55-1

| Package | level 1 | level 2 | level 3 | level 4 | level 5 | Cardinality | Datatype Name |
|---|---|---|---|---|---|---|---|
| Appropriation RequestVariant ByApproverAndIn ApprovalStatus Response Message_sync 55000 | Appropriation RequestVariant ByApproverAndIn ApprovalStatus Response Message_sync 55002 | | | | | | Appropriation RequestVariant ByApproverAndIn ApprovalStatus Response Message_sync 55004 |
| Appropriation Request 55006 | | Appropriation Request 55008 | | | | 0..n 55010 | Appropriation Request 55012 |
| | | | ID 55014 | | | 1 55016 | Appropriation RequestID 55018 |
| | | | Description 55020 | | | 0..1 55022 | MEDIUM_Description 55024 |
| | | | Programme DefinitionID 55026 | | | 1 55028 | Programme DefinitionID 55030 |
| | | | Approval Fiscal YearID 55032 | | | 1 55034 | ApprovalFiscal YearID 55036 |

FIG. 55-2

| Package | level 1 | level 2 | level 3 | level 4 | level 5 | Cardinality | Datatype Name |
|---|---|---|---|---|---|---|---|
| | | | ProgrammeID 55038 | | | 1 55040 | ProgrammeID 55042 |
| Variant 55044 | | | Variant 55046 | | | 1 55048 | Variant 55050 |
| | | | | ID 55052 | | 1 55054 | Appropriation Request VariantID 55056 |
| | | | | Description 55058 | | 0..1 55060 | MEDIUM_Description 55062 |
| Planning Version 55064 | | | | Planning Version 55066 | | 0..n 55068 | PlanningVersion 55070 |
| | | | | | Accounting Planning VersionCode 55072 | 1 55074 | Accounting Planning VersionCode 55076 |
| | | | | | Accounting Planning VersionName 55078 | 0..1 55080 | LONG_name 55082 |

FIG. 55-3

| Package | level 1 | level 2 | level 3 | level 4 | level 5 | Cardinality | Datatype Name |
|---|---|---|---|---|---|---|---|
| Plan Values 55084 | | | | Plan Values 55086 | | 0..n 55088 | PlanValues 55090 |
| | | | | | FiscalYear Dependency Indicator 55092 | 0..1 55094 | Indicator 55096 |
| | | | | | FiscalYearID 55098 | 0..1 55100 | FiscalYearID 55102 |
| | | | | | Investment Amount 55104 | 0..1 55106 | Amount 55108 |
| | | | | | Overhead Amount 55110 | 0..1 55112 | Amount 55114 |
| | | | | | Revenue Amount 55116 | 0..1 55118 | Amount 55120 |
| Log 55122 | | Log 55124 | | | | 1 55126 | Log 55128 |

FIG. 56-1

| Package | Level 1 | level 2 | level 3 | Cardinality | Datatype Name |
|---|---|---|---|---|---|
| AppropriationRequest VariantPlanValuesBy ProgrammeAnd Planning Version QueryMessage_sync 56000 | AppropriationRequest-VariantPlan Values-ByProgrammeAndPlanning VersionQuery Message_sync 56002 | | | | AppropriationRequest VariantPlan-ValuesBy ProgrammeAnd PlanningVersion Query-Message_sync 56004 |
| Selection 56006 | | AppropriationRequestVariant-PlanValues SelectionByProgrammeAndPlanning Version 56008 | | 1 56010 | AppropriationRequest VariantPlan-Values SelectionBy ProgrammeAnd PlanningVersion 56012 |
| | | | Programme DefinitionID 56014 | 1 56016 | Programme DefinitionID 56018 |
| | | | Approval FiscalYearID 56020 | 1 56022 | ApprovalFiscalYearID 56024 |
| | | | ProgrammeID 56026 | 1 56028 | ProgrammeID 56030 |

FIG. 56-2

| Package | Level 1 | level 2 | level 3 | Cardinality | Datatype Name |
|---|---|---|---|---|---|
| | | | Planning Version-Code 56032 | 1 56034 | AccountingPlanning VersionCode 56036 |

FIG. 57-1

| Package | level 1 | level 2 | level 3 | level 4 | level 5 | Cardinality | Datatype Name |
|---|---|---|---|---|---|---|---|
| AppropriationRequest VariantPlanValuesBy ProgrammeAnd PlanningVersion Response Message_sync 57000 | Appropriation-RequestVariant-PlanValues-ByProgramme AndPlanning VersionResponse Message_sync 57002 | | | | | | AppropriationRequestVariantPlan ValuesByProgrammeAndPlanning VersionResponseMessage_sync 57004 |
| Appropriation Request 57006 | | Appropriation-Request 57008 | | | | 0..n 57010 | Appropriation Request 57012 |
| | | | ID 57014 | | | 1 57016 | Appropriation RequestID 57018 |
| | | | Description 57020 | | | 0..1 57022 | MEDIUM_Description 57024 |
| | | | Approval Status-Code 57026 | | | 1 57028 | Approval Status-Code 57030 |

FIG. 57-2

| Package | level 1 | level 2 | level 3 | level 4 | level 5 | Cardinality | Datatype Name |
|---|---|---|---|---|---|---|---|
| | | | Approval Status-Name 57032 | | | 1 57034 | MEDIUM_Name 57036 |
| Variant 57038 | | | Variant 57040 | | | 1 57042 | Variant 57044 |
| | | | | ID 57046 | | 1 57048 | Appropriation RequestVariantID 57050 |
| | | | | Desc rip-tion 57052 | | 0..1 57054 | MEDIUM_Descrip tion 57056 |
| PlanVal-ues 57058 | | | | Plan Val-ues 57060 | | 0..n 57062 | PlanValues 57064 |
| | | | | | FiscalYearDe pendencyIn-dicator 57066 | 0..1 57068 | Indicator 57070 |
| | | | | | FiscalYearID 57072 | 0..1 57074 | FiscalYearID 57076 |

FIG. 57-3

| Package | level 1 | level 2 | level 3 | level 4 | level 5 | Cardinality | Datatype Name |
|---|---|---|---|---|---|---|---|
| | | | | | Investmen-tAmount 57078 | 0..1 57080 | Amount 57082 |
| | | | | | Overhead Amount 57084 | 0..1 57086 | Amount 57088 |
| | | | | | Revenue Amount 57090 | 0..1 57092 | Amount 57094 |
| Log 57096 | | Log 57098 | | | | 1 57100 | Log 57102 |

FIG. 70-1

| Package | level 1 | level 2 | level 3 | level 4 | Cardinality | Datatype Name |
|---|---|---|---|---|---|---|
| CapacityLoadPlanningViewByCapacityLoad-PlanningViewRespon-seMessage_sync 70002 | CapacityLoadPlanningViewByCa-pacityLoadPlan-ningViewRespon-seMessage_sync 70004 | | | | 1 70006 | CapacityLoadPlanningView-ByCapacity-LoadPlanning-ViewRespon-seMes-sage_sync 70008 |
| CapacityLoadPlan-ningView 70010 | | CapacityLoad-PlanningView 70012 | | | 1 70014 | |
| | | | EquipmentRe-sourceID 70016 | | 1 70018 | ResourceID 70020 |
| | | | EvaluationPe-riod 70022 | | 1 70024 | UPPEROPEN_LOCAL_DateTimePeriod 70026 |

FIG. 70-2

| Package | level 1 | level 2 | level 3 | level 4 | Cardinality | Datatype Name |
|---|---|---|---|---|---|---|
| | | | PlanningVersionID 70028 | | 1 70030 | PlanningVersionID 70032 |
| | | | TotalProductiveTimeDuration 70034 | | 1 70036 | TIME_Duration 70038 |
| | | | TotalOccupiedDuration 70040 | | 1 70042 | TIME_Duration 70044 |
| | | | CapacityUtilizationPercent 70046 | | 1 70048 | Percent 70050 |
| | | | ProductionPlanningOrderTotalCapacityLoad 70052 | | | |

FIG. 70-3

| Package | level 1 | level 2 | level 3 | level 4 | Cardinality | Datatype Name |
|---|---|---|---|---|---|---|
| | | | | ProductionPlanningOrderID 70054 | 1 70056 | BusinessTransactionDocumentID 70058 |
| | | | | ProductionPlanningOrderTypeCode 70060 | 1 70062 | BusinessTransactionDocumentTypeCode 70064 |
| | | | | ProductionPlanningOrderFixedIndicator 70066 | 0..1 70068 | Indicator 70070 |
| | | | | ProductionPlanningOrderStartDateTime 70072 | 1 70074 | LOCAL_DateTime 70076 |

FIG. 70-4

| Package | level 1 | level 2 | level 3 | level 4 | Cardinality | Datatype Name |
|---|---|---|---|---|---|---|
| | | | | ProductionPlanningOrderTotalOperationDuration 70078 | 1 70080 | TIME_Duration 70082 |
| Log 70084 | | Log 70086 | | | 1 70088 | Log 70090 |

FIG. 71-1

| Package | level 1 | level 2 | level 3 | Cardinality | Datatype Name |
|---|---|---|---|---|---|
| CapacityLoadPlanningViewBy-CpacityLoadPlanningViewQuery-Message_sync 71002 | Capacity-LoadPlan-ningViewBy-CapcityLoad-Planning-ViewQuery-Mes-sage_sync 71004 | | | 1 71006 | CapacityLoadPlanning-ViewByCapacityLoad-PlanningViewQuery-Message_sync 71008 |
| CapacityLoadPlan-ningViewSelectionBy-CapacityLoadPlan-ningView 71010 | | Capacity-LoadPlan-ningViewSe-lectionBy-Capacity-LoadPlan-ningView 71012 | | 1 71014 | |
| | | | Evalua-tionPeriod 71016 | 1 71018 | UPPEROPEN_LOCAL_DateTimePeriod 71020 |

FIG. 71-2

| Package | | | | level 1 | level 2 | level 3 | Cardinality | Datatype Name |
|---|---|---|---|---|---|---|---|---|
| | | | | | | Planning-VersionID 71022 | 1 71024 | PlanningVersionID 71026 |
| | | | | | | Equipmen-tResour-ceID 71028 | 1 71030 | ResourceID 71032 |

FIG. 72-1

| Package | level 1 | level 2 | level 3 | level 4 | Cardinality | Datatype Name |
|---|---|---|---|---|---|---|
| CapacityLoadPlanning-ViewSimpleByElementsQue-ryMessage_sync 72002 | CapacityLoad-Planning-ViewSimpleByE-lementsQuery-Message_sync 72004 | | | | 1 72006 | Capacity-LoadPlan-ning-ViewSim-pleByEle-mentsQue-ryMes-sage_sync 72008 |
| CapacityLoadPlan-ningViewSimpleSe-lectionByElements 72010 | | CapacityLoad-Planning-ViewSimpleSe-lectionByEle-ments 72012 | | | 1 72014 | |

FIG. 72-2

| Package | | | | level 1 | level 2 | level 3 | level 4 | Cardinality | Datatype Name |
|---|---|---|---|---|---|---|---|---|---|
| | | | | | | Evaluation-Period 72016 | | 1 72018 | UPPEROPEN_LOCAL_DateTimePeriod 72020 |
| | | | | | | PlanningVer-sionID 72022 | | 1 72024 | Planning-VersionID 72026 |
| | | | | | | Selection-ByEquip-mentResour-celD 72028 | | 1 72030 | Selection-ByEquip-mentRe-sourceID 72032 |
| | | | | | | | InclusionEx-clusionCode 72034 | 1 72036 | Inclusion-Exclusion-Code 72038 |

FIG. 72-3

| Package | | | | level 1 | level 2 | level 3 | level 4 | Cardinality | Datatype Name |
|---|---|---|---|---|---|---|---|---|---|
| | | | | | | | Interval-Bound-aryType-Code 72040 | 1 72042 | Interval-Bound-aryType-Code 72044 |
| | | | | | | | Lower-BoundaryEquip-mentResour-ceID 72046 | 1 72048 | Resour-ceID 72050 |
| | | | | | | | UpperBound-aryEquip-mentResour-ceID 72052 | 0..1 72054 | Resour-ceID 72056 |

FIG. 73-1

| Package | level 1 | level 2 | level 3 | Cardinality | Datatype Name |
|---|---|---|---|---|---|
| CapacityLoadPlanning-ViewSimpleByElementsRe-sponseMessage_sync 73002 | CapacityLoadPlan-ningViewSimple-ByElementsRe-sponseMes-sage_sync 73004 | | | 1 73006 | CapacityLoadPlanning-ViewSimpleByEle-mentsResponseMes-sage_sync 73008 |
| CapacityLoadPlan-ningView 73010 | | Capacity-LoadPlan-ningView 73012 | | 1..n 73014 | |
| | | | Equipmen-tResour-ceID 73016 | 1 73018 | ResourceID 73020 |
| | | | Evalua-tionPeriod 73022 | 1 73024 | UPPEROPEN_LOCAL_DateTimePeriod 73026 |

FIG. 73-2

| Package | | | | level 1 | level 2 | level 3 | Cardinality | Datatype Name |
|---|---|---|---|---|---|---|---|---|
| | | | | | | Planning-VersionID 73028 | 1 73030 | PlanningVersionID 73032 |
| | | | | | | TotalProductiveTimeDuration 73034 | 1 73036 | TIME_Duration 73038 |
| | | | | | | TotalOccupiedDuration 73040 | 1 73042 | TIME_Duration 73044 |
| | | | | | | CapacityUtilizationPercent 73046 | 1 73048 | Percent 73050 |

FIG. 73-3

| Package | | level 1 | level 2 | level 3 | Cardinality | Datatype Name |
| --- | --- | --- | --- | --- | --- | --- |
| | Log 73052 | | Log 73054 | | 1 73056 | Log 73058 |

FIG. 83

| | level 1 | level 2 | level 3 | Cardinality | Datatype Name |
|---|---|---|---|---|---|
| CustomerQuoteAcceptanceAcknowledgementConfirmationMessage 83000 | Customer-QuoteAcceptConfirmationMessage 83002 | | | | Customer-QuoteAcceptanceAcknowledgementConfirmationMessage 83004 |
| CustomerQuote 83006 | | Customer-Quote 83008 | | 0..1 83010 | ... |
| | | | ID 83012 | 1 83014 | BusinessTransactionDocumentID 83016 |
| | | | AcceptanceStatus-Code 83018 | 1 83020 | AcceptanceStatusCode 83022 |
| Log 83024 | | Log 83026 | | 0..1 83028 | Log 83030 |

FIG. 84

| | level 1 | level 2 | level 3 | Cardinality | Datatype Name |
|---|---|---|---|---|---|
| CustomerQuoteAcceptanceAcknowledgementRequestMessage 84000 | CustomerQuoteAcceptRequestMessage 84002 | | | | CustomerQuoteAcceptanceAcknowledgementRequestMessage 84004 |
| CustomerQuote 84006 | | CustomerQuote 84008 | | 1 84010 | ... |
| | | | ID 84012 | 1 84014 | BusinessTransactionDocumentID 84016 |

FIG. 85

| Package | level 1 | level 2 | level 3 | Cardinality | Datatype Name |
|---|---|---|---|---|---|
| CustomerQuoteBy-IDQueryMessage 85000 | Customer-Quote 85002 | | | | CustomerQuoteByIDQueryMessage 85004 |
| Selection 85006 | | CustomerQuoteSelectionByID 85008 | | 1 85010 | CustomerQuoteSelectionByID 85012 |
| | | | Customer-QuoteID 85014 | 1 85016 | BusinessTransactionDocumentID 85018 |

FIG. 86-1

| Package | level 1 | level 2 | level 3 | level 4 | level 5 | Cardinality | Datatype Name |
|---|---|---|---|---|---|---|---|
| CustomerQuoteBy-IDResponseMessage 86000 | Customer-Quote 86002 | | | | | | CustomerQuoteByIDRe-sponseMessage 86004 |
| CustomerQuote 86006 | | Customer-Quote 86008 | | | | 0..1 86010 | … |
| | | | ID 86012 | | | 1 86014 | BusinessTransaction-DocumentID 86016 |
| Party 86018 | | | BuyerParty 86020 | | | 1 86022 | BusinessTransaction-DocumentParty 86024 |
| | | | | SellerID 86026 | | 1 86028 | PartyPartyID 86030 |

FIG. 86-2

| Package | level 1 | level 2 | level 3 | level 4 | level 5 | Cardinality | Datatype Name |
|---|---|---|---|---|---|---|---|
| DateTerms 86032 | | | DateTerms 86034 | | | 1 86036 | |
| | | | | Valid-ityStart-Time-PointDate 86038 | | 1 86040 | Date 86042 |
| | | | | ValidityEnd Time-PointDate 86044 | | 1 86046 | Date 86048 |

FIG. 86-3

| Package | level 1 | level 2 | level 3 | level 4 | level 5 | Cardinality | Datatype Name |
|---|---|---|---|---|---|---|---|
| TotalValues 86050 | | | TotalValues 86052 | | | 1 86054 | ... |
| | | | | NetAmount 86056 | | 1 86058 | Amount 86060 |
| Item 86062 | | | Item 86064 | | | 0..n 86066 | ... |
| | | | | ID 86068 | | 1 86070 | BusinessTransaction-DocumentItemID 86072 |
| | | | | Description 86074 | | 1 86076 | SHORT_DESCRIPTION 86078 |
| Product 86080 | | | | Product 86082 | | 1 86084 | |

FIG. 86-4

| Package | level 1 | level 2 | level 3 | level 4 | level 5 | Cardinality | Datatype Name |
|---|---|---|---|---|---|---|---|
| | | | | | SellerID 86086 | 1 86088 | ProductPartyID 86090 |
| Sched-uleLine 86092 | | | | Sched-uleLine 86094 | | 1 86096 | ... |
| | | | | | Request-edQuan-tity 86098 | 1 86100 | Quantity 86102 |
| TotalValues 86104 | | | | TotalValues 86106 | | 1 86108 | ... |
| | | | | | NetA-mount 86110 | 1 86112 | Amount 86114 |
| Log 86116 | | Log 86118 | | | | 0..1 86120 | Log 86122 |

FIG. 87

| | level 1 | level 2 | level 3 | Cardinality | Datatype Name |
|---|---|---|---|---|---|
| CustomerQuoteChange-ConfirmationMessage 87000 | CustomerQuote-ChangeConfirma-tionMessage 87002 | | | | CustomerQuote-ChangeConfirmation-Message 87004 |
| CustomerQuote 87006 | | CustomerQuote 87008 | | 0..1 87010 | ... |
| | | | ID 87012 | 1 87014 | BusinessTransaction-DocumentID 87016 |
| | | | AcceptanceS-tatusCode 87018 | 1 87020 | AcceptanceStatus-Code 87022 |
| Log 87024 | | Log 87026 | | 0..1 87028 | Log 87030 |

FIG. 88-1

| Package | level 1 | level 2 | level 3 | level 4 | level 5 | Cardinality | Datatype Name |
|---|---|---|---|---|---|---|---|
| CustomerQuote-ChangeRequestMes-sage 88000 | Customer-Quote-ChangeRe-questMes-sage 88002 | | | | | | CustomerQuote-ChangeRe-questMessage 88004 |
| CustomerQuote 88006 | | Customer-Quote 88008 | | | | 1 88010 | … |
| | | | ID 88012 | | | 1 88014 | BusinessTrans-actionDocumen-tID 88016 |
| Party 88018 | | | BuyerParty 88020 | | | 1 88022 | … |
| | | | | SellerID 88024 | | 1 88026 | PartyPartyID 88028 |

FIG. 88-2

| Package | level 1 | level 2 | level 3 | level 4 | level 5 | Cardinality | Datatype Name |
|---|---|---|---|---|---|---|---|
| TextCollection 88030 | | | TextCollection 88032 | | | 0..1 88034 | TextCollection 88036 |
| | | | | ActionCode 88038 | | 0..1 88040 | ActionCode 88042 |
| | | | | Text 88044 | | 0..n 88046 | TextCollection-Text 88048 |
| | | | | | ActionCode 88050 | 0..1 88052 | ActionCode 88054 |
| | | | | | TypeCode 88056 | 0..1 88058 | TextCollection-TextTypeCode 88060 |
| | | | | | CreationDateTime 88062 | 0..1 88064 | GLOBAL_DateTime 88066 |

FIG. 88-3

| Package | level 1 | level 2 | level 3 | level 4 | level 5 | Cardinality | Datatype Name |
|---|---|---|---|---|---|---|---|
| | | | | | ContentText 88068 | 1 88070 | Text 88072 |
| Item 88074 | | | Item 88076 | | | 0..n 88078 | ... |
| | | | | ID 88080 | | 1 88082 | BusinessTrans-actionDocumen-tItemID 88084 |
| Product 88086 | | | | Product 88088 | | 1 88090 | |
| | | | | | SellerID 88092 | 1 88094 | ProductPartyID 88096 |
| Sched-uleLine 88098 | | | | Sched-uleLine 88100 | | 1 88102 | ... |
| | | | | | Request-edQuantity 88104 | 1 88106 | Quantity 88108 |

FIG. 88-4

| Package | level 1 | level 2 | level 3 | level 4 | level 5 | Cardinality | Datatype Name |
|---|---|---|---|---|---|---|---|
| Log 88110 | | Log 88112 | | | | 0..1 88114 | Log 88116 |

FIG. 89

| | level 1 | level 2 | level 3 | Cardinality | Datatype Name |
|---|---|---|---|---|---|
| CustomerQuoteCreateConfirmationMessage 89000 | CustomerQuoteCreateConfirmation-Message 89002 | | | | Customer-QuoteCreateConfirmationMessage 89004 |
| CustomerQuote 89006 | | CustomerQuote 89008 | | 0..1 89010 | ... |
| | | | ID 89012 | 1 89014 | Business-Transaction-DocumentID 89016 |
| | | | AcceptanceStatusCode 89018 | 1 89020 | AcceptanceStatusCode 89022 |
| Log 89024 | | Log 89026 | | 0..1 89028 | Log 89030 |

FIG. 90-1

| Package | level 1 | level 2 | level 3 | level 4 | level 5 | Cardinality | Datatype Name |
|---|---|---|---|---|---|---|---|
| CustomerQuoteCreateRequestMessage 90000 | CustomerQuoteCreateRequestMessage 90002 | | | | | | CustomerQuoteCreateRequestMessage 90004 |
| CustomerQuote 90006 | | CustomerQuote 90008 | | | | 1 90010 | ... |
| | | | ProcessingTypeCode 90012 | | | 1 90014 | BusinessTransactionDocumentProcessingTypeCode 90016 |
| Party 90018 | | | BuyerParty 90020 | | | 0..1 90022 | BusinessTransactionDocumentParty 90024 |

FIG. 90-2

| Package | level 1 | level 2 | level 3 | level 4 | level 5 | Cardinality | Datatype Name |
|---|---|---|---|---|---|---|---|
| | | | | SellerID 90026 | | 1 90028 | PartyPartyID 90030 |
| Item 90032 | | | Item 90034 | | | 0..n 90036 | ... |
| | | | | ID 90038 | | 1 90040 | Business-Transaction-Documen-tItemID 90042 |
| Product 90044 | | | | Product 90046 | | 1 90048 | Business-Transaction-Document-Product 90050 |
| | | | | | SellerID 90052 | 1 90054 | Product-PartyID 90056 |

FIG. 90-3

| Package | level 1 | level 2 | level 3 | level 4 | level 5 | Cardinality | Datatype Name |
|---|---|---|---|---|---|---|---|
| ScheduleLine 90058 | | | | Sched-uleLine 90060 | | 1 90062 | ... |
| | | | | | Request-edQuantity 90064 | 1 90066 | Quantity 90068 |
| Log 90070 | | Log 90072 | | | | 0..1 90074 | Log 90076 |

FIG. 99

| Package | level 1 | level 2 | level 3 | Cardinality | Datatype Name |
|---|---|---|---|---|---|
| CustomerQuoteAllowedUserStatusByProcessingTypeCodeQueryMessage_sync 99000 | CustomerQuoteAllowedUserStatusByProcessingTypeCodeQueryMessage_sync 99002 | | | | CustomerQuoteAllowedUserStatusByProcessingTypeCodeQueryMessage_sync 99004 |
| | | | ID 99006 | 1 99008 | BusinessDocumentMessageID 99010 |
| | | | CreationDateTime 99012 | 1 99014 | DateTime 99016 |
| | | | … | 0..1 | … |
| Selection 99020 | | CustomerQuoteAllowedUserStatusSelectionByProcessingTypeCode 99022 | | 1 99024 | |
| | | | CustomerQuoteProcessingTypeCode 99026 | 1 99028 | BusinessTransactionDocumentProcessingTypeCode 99030 |

FIG. 100-1

| Package | level 1 | level 2 | level 3 | Cardinality | Datatype Name |
|---|---|---|---|---|---|
| CustomerQuoteAllowedUserStatusByProcessingTypeCodeResponseMessage_sync 100000 | CustomerQuoteAllowedUserStatusByProcessingTypeCodeResponseMessage_sync 100002 | | | | CustomerQuoteAllowedUserStatusByProcessingTypeCodeResponseMessage_sync 100004 |
| | | | ID 100006 | 1 100008 | BusinessDocumentMessageID 100010 |
| | | | CreationDateTime 100012 | 1 100014 | DateTime 100016 |
| | | | … | 0..1 | … |
| CustomerQuote 100020 | | CustomerQuoteAllowedUserStatus 100022 | | 0..N 100024 | |
| | | | UserStatusProfileCode 100026 | 1 100028 | UserStatusProfileCode 100030 |
| | | | UserStatusProfileName 100032 | 1 100034 | LEN30_Name 100036 |

FIG. 100-2

| Package | level 1 | level 2 | level 3 | Cardinality | Datatype Name |
|---|---|---|---|---|---|
| | | | UserStatus-Code 100038 | 1 100040 | UserStatusCode 100042 |
| | | | UserStatus-Name 100044 | 1 100046 | LEN30_Name 100048 |
| | | | UserStatu-sOrdinal-Number-Value 100050 | 1 100052 | OrdinalNumberValue 100054 |
| Log 100056 | | Log 100058 | | 1 100060 | Log 100062 |

FIG. 101-1

| Package | level 1 | level 2 | level 3 | Cardinality | Datatype Name |
|---|---|---|---|---|---|
| CustomerQuote-BasicDataBy-BasicDataAndUser-StatusQueryMes-sage_sync 101000 | CustomerQuote-BasicDataBy-BasicDataAndUs-erStatusQueryMes-sage_sync 101002 | | | | CustomerQuoteBasicDa-taByBasicDataAndUser-StatusQueryMes-sage_sync 101004 |
| | | | ID 101006 | 1 101008 | BusinessDocumentMes-sageID 101010 |
| | | | CreationDateTime 101012 | 1 101014 | DateTime 101016 |
| | | | ... | 0..1 | ... |
| Selection 101020 | | CustomerQuote-BasicDataSelec-tionBy-BasicDataAndUs-erStatus 101022 | | 1 101024 | |
| | | | CustomerQuote-ProcessingType-Code 101026 | 0..1 101028 | BusinessTransaction-DocumentProcessing-TypeCode 101030 |

FIG. 101-2

| Package | | level 1 | level 2 | level 3 | Cardinality | Datatype Name |
|---|---|---|---|---|---|---|
| | | | | CustomerQuote-BuyerPartyInter-nalID 101032 | 0..1 101034 | PartyInternalID 101036 |
| | | | | CustomerQuote-SalesOrganisation-PartyInternalID 101038 | 0..1 101040 | PartyInternalID 101042 |
| | | | | CustomerQuote-SalesOfficeParty-InternalID 101044 | 0..1 101046 | PartyInternalID 101048 |
| | | | | CustomerQuote-SalesGroupParty-InternalID 101050 | 0..1 101052 | PartyInternalID 101054 |
| | | | | CustomerQuote-SalesTermsDis-tributionChannel-Code 101056 | 0..1 101058 | DistributionChannelCode 101060 |

FIG. 101-3

| Package | | level 1 | level 2 | level 3 | Cardinality | Datatype Name |
|---|---|---|---|---|---|---|
| | | | | CustomerQuote-SalesTermsDivi-sionCode 101062 | 0..1 101064 | DivisionCode 101066 |
| | | | | CustomerQuoteS-tatusObjectUser-StatusProfileCode 101068 | 0..1 101070 | UserStatusProfileCode 101072 |
| | | | | CustomerQuoteS-tatusObjectUser-StatusCode 101074 | 0..1 101076 | UserStatusCode 101078 |

FIG. 102-1

| Package | level 1 | level 2 | level 3 | level 4 | Cardinality | Datatype Name |
|---|---|---|---|---|---|---|
| CustomerQuote-BasicDataBy-BasicDataAndUser-StatusResponse-Message_sync 102000 | CustomerQuote-BasicDataBy-BasicDataAn-dUserStatusRe-sponseMes-sage_sync 102002 | | | | | CustomerQuote-BasicDataBy-BasicDataAndUser-StatusResponseMes-sage_sync 102004 |
| | | | ID 102006 | | 1 102008 | BusinessDocument-MessageID 102010 |
| | | | Creation-DateTime 102012 | | 1 102014 | DateTime 102016 |
| | | | ... | | 0..1 | ... |
| CustomerQuote 102020 | | CustomerQuote 102022 | | | 0..N 102024 | |
| | | | ID 102026 | | 1 102028 | CustomerQuoteID 102030 |
| | | | Processing-TypeCode 102032 | | 0..1 102034 | BusinessTransaction-DocumentProcessing-TypeCode 102036 |

FIG. 102-2

| Package | level 1 | level 2 | level 3 | level 4 | Cardinality | Datatype Name |
|---|---|---|---|---|---|---|
| | | | BuyerID 102038 | | 0..1 102040 | BusinessTransaction-DocumentID 102042 |
| | | | StausObject 102044 | | 0..1 102046 | StatusObject 102048 |
| Party 102050 | | | BuyerParty 102052 | | 1 102054 | |
| | | | | InternalID 102056 | 1 102058 | PartyInternalID 102060 |
| | | | | Formatted-Name 102062 | 0..1 102064 | LONG_Name, Quali-fier: PartyFormatted 102066 |
| | | | SalesOrgani-sationParty 102068 | | 1 102070 | |
| | | | | InternalID 102072 | 1 102074 | PartyInternalID 102076 |
| | | | SalesOffice-Party 102078 | | 0..1 102080 | |

FIG. 102-3

| Package | level 1 | level 2 | level 3 | level 4 | Cardinality | Datatype Name |
|---|---|---|---|---|---|---|
| | | | | InternalID 102082 | 1 102084 | PartyInternalID 102086 |
| | | | SalesGroup-Party 102088 | | 0..1 102090 | |
| | | | | InternalID 102092 | 1 102094 | PartyInternalID 102096 |
| SalesTerms 102098 | | | SalesTerms 1020100 | | 0..1 1020102 | |
| | | | | Distribution-Channel-Code 1020104 | 0..1 1020106 | DistributionChannel-Code 1020108 |
| | | | | Division-Code 1020110 | 0..1 1020112 | DivisionCode 1020114 |
| DateTerms 1020116 | | | DateTerms 1020118 | | 0..1 1020120 | |
| | | | | RequestDate 1020122 | 0..1 1020124 | Date 1020126 |

FIG. 102-4

| Package | level 1 | level 2 | level 3 | level 4 | Cardinality | Datatype Name |
|---|---|---|---|---|---|---|
| | | | | Valid-ityStartDate 1020128 | 0..1 1020130 | Date 1020132 |
| | | | | Valid-itytEndDate 1020134 | 0..1 1020136 | Date 1020138 |
| TotalValues 1020140 | | | TotalValues 1020142 | | 0..1 1020144 | |
| | | | | NetAmount 1020146 | 0..1 1020148 | Amount 1020150 |
| Log 1020152 | | Log 1020154 | | | 1 1020156 | Log 1020158 |

FIG. 103-1

| Package | level 1 | level 2 | level 3 | Cardinality | Datatype Name |
|---|---|---|---|---|---|
| CustomerQuote-BasicDataByBuyer-AndBasicDataQue-ryMessage_sync 103000 | Customer-QuoteBasicDa-taByBuyerAnd-BasicDataQue-ryMessage_sync 103002 | | | | CustomerQuoteBasicDa-taByBuyerAndBasicData-QueryMessage_sync 103004 |
| | | | ID 103006 | 1 103008 | BusinessDocumentMes-sageID 103010 |
| | | | CreationDateTime 103012 | 1 103014 | DateTime 103016 |
| | | | ... | 0..1 | ... |
| Selection 103020 | | Customer-Quote-BasicDataSe-lectionBy-BuyerAnd-BasicData 103022 | | 1 103024 | |
| | | | CustomerQuoteBuyer-PartyInternalID 103026 | 1 103028 | PartyInternalID 103030 |

FIG. 103-2

| Package | | level 1 | level 2 | level 3 | Cardinality | Datatype Name |
|---|---|---|---|---|---|---|
| | | | | CustomerQuoteSalesOrganisationPartyInternalID 103032 | 0..1 103034 | PartyInternalID 103036 |
| | | | | CustomerQuoteSalesOfficePartyInternalID 103038 | 0..1 103040 | PartyInternalID 103042 |
| | | | | CustomerQuoteSalesGroupPartyInternalID 103044 | 0..1 103046 | PartyInternalID 103048 |
| | | | | CustomerQuoteProcessingTypeCode 103050 | 0..1 103052 | BusinessTransactionDocumentProcessingTypeCode 103054 |
| | | | | CustomerQuoteSalesTermsDistributionChannelCode 103056 | 0..1 103058 | DistributionChannelCode 103060 |
| | | | | CustomerQuoteSalesTermsDivisionCode 103062 | 0..1 103064 | DivisionCode 103066 |

FIG. 104-1

| Package | level 1 | level 2 | level 3 | level 4 | Cardinality | Datatype Name |
|---|---|---|---|---|---|---|
| CustomerQuote-BasicDataByBuyer-AndBasicDataRe-sponseMessage_sync 104000 | CustomerQuote-BasicDataByBuyer-AndBasicDataRe-sponseMes-sage_sync 104002 | | | | | CustomerQuoteBasicDa-taByBuyerAndBasicDataRe-sponseMessage_sync 104004 |
| | | | ID 104006 | | 1 104008 | BusinessDocumentMes-sageID 104010 |
| | | | Creation-DateTime 104012 | | 1 104014 | DateTime 104016 |
| | | | ... | | 0..1 | ... |
| CustomerQuote 104020 | | Customer-Quote 104022 | | | 0..N 104024 | |
| | | | ID 104026 | | 1 104028 | CustomerQuoteID 104030 |

FIG. 104-2

| Package | level 1 | level 2 | level 3 | level 4 | Cardinality | Datatype Name |
|---|---|---|---|---|---|---|
| | | | Process-ingType-Code 104032 | | 0..1 104034 | BusinessTransactionDocu-mentProcessingTypeCode 104036 |
| | | | Processing-TypeName 104038 | | 0..1 104040 | MEDIUM_Name, Qualifier: ProcessingType 104042 |
| | | | BuyerID 104044 | | 0..1 104046 | BusinessTransactionDocu-mentID 104048 |
| Party 104050 | | | BuyerParty 104052 | | 1 104054 | |
| | | | | InternalID 104056 | 1 104058 | PartyInternalID 104060 |
| | | | | Formatted-Name 104062 | 0..1 104064 | LONG_Name, Qualifier: Par-tyFormatted 104066 |
| | | | SalesOr-ganisation-Party 104068 | | 1 104070 | |

FIG. 104-3

| Package | level 1 | level 2 | level 3 | level 4 | Cardinality | Datatype Name |
|---|---|---|---|---|---|---|
| | | | | InternalID 104072 | 1 104074 | PartyInternalID 104076 |
| | | | | Formatted-Name 104078 | 0..1 104080 | LONG_Name, Qualifier: PartyFormatted 104082 |
| | | | Sale-sOfficeParty 104084 | | 0..1 104086 | |
| | | | | InternalID 104088 | 1 104090 | PartyInternalID 104092 |
| | | | | Formatted-Name 104094 | 0..1 104096 | LONG_Name, Qualifier: PartyFormatted 104098 |
| | | | Sales-GroupParty 1040100 | | 0..1 1040102 | |
| | | | | InternalID 1040104 | 1 1040106 | PartyInternalID 1040108 |

FIG. 104-4

| Package | level 1 | level 2 | level 3 | level 4 | Cardinality | Datatype Name |
|---|---|---|---|---|---|---|
| | | | | Formatted-Name 1040110 | 0..1 1040112 | LONG_Name, Qualifier: PartyFormatted 1040114 |
| SalesTerms 1040116 | | | SalesTerms 1040118 | | 0..1 1040120 | |
| | | | | Distribu-tionChan-nelCode 1040122 | 0..1 1040124 | DistributionChannelCode 1040126 |
| | | | | Distribu-tionChan-nelName 1040128 | 0..1 1040130 | MEDIUM_Name, Qualifier: DistributionChannel 1040132 |
| | | | | Division-Code 1040134 | 0..1 1040136 | DivisionCode 1040138 |
| | | | | Division-Name 1040140 | 0..1 1040142 | MEDIUM_Name, Qualifier: Division 1040144 |
| DateTerms 1040146 | | | DateTerms 1040148 | | 0..1 1040150 | |

FIG. 104-5

| Package | level 1 | level 2 | level 3 | level 4 | Cardinality | Datatype Name |
|---|---|---|---|---|---|---|
| | | | | Request-Date 1040152 | 0..1 1040154 | Date 1040156 |
| | | | | Valid-ityStartDate 1040158 | 1 1040160 | Date 1040162 |
| | | | | Valid-itytEndDate 1040164 | 1 1040166 | Date 1040168 |
| TotalValues 1040170 | | | TotalValues 1040172 | | 0..1 1040174 | |
| | | | | NetAmount 1040176 | 0..1 1040178 | Amount 1040180 |
| Log 1040182 | | Log 1040184 | | | 1 1040186 | Log 1040188 |

FIG. 105

| Package | level 1 | level 2 | level 3 | Cardinality | Datatype Name |
|---|---|---|---|---|---|
| CustomerQuoteBasicDataByBuyerAndIncompletenessQueryMessage_sync 105000 | CustomerQuoteBasicDataByBuyerAndIncompletenessQueryMessage_sync 105002 | | | | CustomerQuoteBasicDataByBuyerAndIncompletenessQueryMessage_sync 105004 |
| | | | ID 105006 | 1 105008 | BusinessDocumentMessageID 105010 |
| | | | CreationDateTime 105012 | 1 105014 | DateTime 105016 |
| | | | ... | 0..1 | ... |
| Selection 105020 | | CustomerQuoteBasicDataSelectionByBuyerAndIncompleteness 105022 | | 1 105024 | |
| | | | CustomerQuoteBuyerPartyInternalID 105026 | 1 105028 | PartyInternalID 105030 |

FIG. 106-1

| Package | level 1 | level 2 | level 3 | level 4 | Cardinality | Datatype Name |
|---|---|---|---|---|---|---|
| CustomerQuote-BasicDataBy-BuyerAndIncom-pletenessRespon-seMessage_sync 106000 | CustomerQuote-BasicDataBy-BuyerAndIncom-pletenessRespon-seMessage_sync 106002 | | | | | CustomerQuote-BasicDataByBuyer-AndIncomplete-nessResponseMes-sage_sync 106004 |
| | | | ID 106006 | | 1 106008 | BusinessDocu-mentMessageID 106010 |
| | | | Creation-DateTime 106012 | | 1 106014 | DateTime 106016 |
| | | | ... | | 0..1 | ... |
| CustomerQuote 106020 | | CustomerQuote 106022 | | | 0..N 106024 | |
| | | | ID 106026 | | 1 106028 | CustomerQuoteID 106030 |
| | | | Processing-TypeCode 106032 | | 0..1 106034 | BusinessTransac-tionDocumentProc-essingTypeCode 106036 |

FIG. 106-2

| Package | level 1 | level 2 | level 3 | level 4 | Cardinality | Datatype Name |
|---|---|---|---|---|---|---|
| | | | Processing-TypeName 106038 | | 0..1 106040 | MEDIUM_Name, Qualifier: Process-ingType 106042 |
| | | | BuyerID 106044 | | 0..1 106046 | BusinessTransac-tionDocumentID 106048 |
| Party 106050 | | | BuyerParty 106052 | | 1 106054 | |
| | | | | InternalID 106056 | 1 106058 | PartyInternalID 106060 |
| | | | | Formatted-Name 106062 | 0..1 106064 | LONG_Name, Qualifier: PartyFor-matted 106066 |
| | | | SalesOrgani-sationParty 106068 | | 1 106070 | |
| | | | | InternalID 106072 | 1 106074 | PartyInternalID 106076 |

FIG. 106-3

| Package | level 1 | level 2 | level 3 | level 4 | Cardinality | Datatype Name |
|---|---|---|---|---|---|---|
| | | | | Formatted-Name 106078 | 0..1 106080 | LONG_Name, Qualifier: PartyFor-matted 106082 |
| | | | SalesOffice-Party 106084 | | 0..1 106086 | |
| | | | | InternalID 106088 | 1 106090 | PartyInternalID 106092 |
| | | | | Formatted-Name 106094 | 0..1 106096 | LONG_Name, Qualifier: PartyFor-matted 106098 |
| | | | SalesGroup-Party 1060100 | | 0..1 1060102 | |
| | | | | InternalID 1060104 | 1 1060106 | PartyInternalID 1060108 |
| | | | | Formatted-Name 1060110 | 0..1 1060112 | LONG_Name, Qualifier: PartyFor-matted 1060114 |

FIG. 106-4

| Package | level 1 | level 2 | level 3 | level 4 | Cardinality | Datatype Name |
|---|---|---|---|---|---|---|
| SalesTerms 1060116 | | | SalesTerms 1060118 | | 0..1 1060120 | |
| | | | | Distribution-Channel-Code 1060122 | 0..1 1060124 | DistributionChannelCode 1060126 |
| | | | | Distribution-Channel-Name 1060128 | 0..1 1060130 | MEDIUM_Name, Qualifier: DistributionChannel 1060132 |
| | | | | Division-Code 1060134 | 0..1 1060136 | DivisionCode 1060138 |
| | | | | Division-Name 1060140 | 0..1 1060142 | MEDIUM_Name, Qualifier: Division 1060144 |
| DateTerms 1060146 | | | DateTerms 1060148 | | 0..1 1060150 | |
| | | | | RequestDate 1060152 | 0..1 1060154 | Date 1060156 |
| | | | | ValidityStartDate 1060158 | 1 1060160 | Date 1060162 |

FIG. 106-5

| Package | level 1 | level 2 | level 3 | level 4 | Cardinality | Datatype Name |
|---|---|---|---|---|---|---|
| | | | | Valid-itytEndDate 1060164 | 1 1060166 | Date 1060168 |
| TotalValues 1060170 | | | TotalValues 1060172 | | 0..1 1060174 | |
| | | | | NetAmount 1060176 | 0..1 1060178 | Amount 1060180 |
| Log 1060182 | | Log 1060184 | | | 1 1060186 | Log 1060188 |

FIG. 107-1

| Package | level 1 | level 2 | level 3 | Cardinality | Datatype Name |
|---|---|---|---|---|---|
| CustomerQuote-BasicDataByBuyer-AndValidityPeriod-QueryMessage_sync 107000 | CustomerQuote-BasicDataByBuyerAnd-ValidityPeriodQuery-Message_sync 107002 | | | | CustomerQuote-BasicDataBy-BuyerAndValid-ityPeriodQuery-Message_sync 107004 |
| | | | ID 107006 | 1 107008 | BusinessDocu-mentMessageID 107010 |
| | | | CreationDateTime 107012 | 1 107014 | DateTime 107016 |
| | | | … | 0..1 | … |
| Selection 107020 | | CustomerQuote-BasicDataSelec-tionByBuyerAnd-ValidityPeriod 107022 | | 1 107024 | |
| | | | CustomerQuoteBuyer-PartyInternalID 107026 | 1 107028 | PartyInternalID 107030 |

FIG. 107-2

| Package | level 1 | level 2 | level 3 | Cardinality | Datatype Name |
|---|---|---|---|---|---|
| | | | CustomerQuote-DateTermsValidityStartDate 107032 | 1 107034 | Date 107036 |
| | | | CustomerQuote-DateTermsValidityEndDate 107038 | 1 107040 | Date 107042 |

FIG. 108-1

| Package | level 1 | level 2 | level 3 | level 4 | Cardinality | Datatype Name |
|---|---|---|---|---|---|---|
| CustomerQuoteBasicDataByBuyerAndValidityPeriodResponseMessage_sync 108000 | CustomerQuoteBasicDataByBuyerAndValidityPeriodResponseMessage_sync 108002 | | | | | CustomerQuoteBasicDataByBuyerAndValidityPeriodResponseMessage_sync 108004 |
| | | | ID 108006 | | 1 108008 | BusinessDocumentMessageID 108010 |
| | | | CreationDateTime 108012 | | 1 108014 | DateTime 108016 |
| | | | … | | 0..1 | … |
| CustomerQuote 108020 | | CustomerQuote 108022 | | | 0..N 108024 | |
| | | | ID 108026 | | 1 108028 | CustomerQuoteID 108030 |
| | | | ProcessingTypeCode 108032 | | 0..1 108034 | BusinessTransactionDocumentProcessingTypeCode 108036 |

FIG. 108-2

| Package | level 1 | level 2 | level 3 | level 4 | Cardinality | Datatype Name |
|---|---|---|---|---|---|---|
| | | | Process-ingTypeName 108038 | | 0..1 108040 | MEDIUM_Name, Qualifier: Process-ingType 108042 |
| | | | BuyerID 108044 | | 0..1 108046 | BusinessTransac-tionDocumentID 108048 |
| Party 108050 | | | BuyerParty 108052 | | 1 108054 | |
| | | | | InternalID 108056 | 1 108058 | PartyInternalID 108060 |
| | | | | Format-tedName 108062 | 0..1 108064 | LONG_Name, Qualifier: Party-Formatted 108066 |
| | | | SalesOr-ganisation-Party 108068 | | 1 108070 | |
| | | | | InternalID 108072 | 1 108074 | PartyInternalID 108076 |

FIG. 108-3

| Package | level 1 | level 2 | level 3 | level 4 | Cardinality | Datatype Name |
|---|---|---|---|---|---|---|
| | | | | Format-tedName 108078 | 0..1 108080 | LONG_Name, Qualifier: Party-Formatted 108082 |
| | | | Sale-sOfficeParty 108084 | | 0..1 108086 | |
| | | | | InternalID 108088 | 1 108090 | PartyInternalID 108092 |
| | | | | Format-tedName 108094 | 0..1 108096 | LONG_Name, Qualifier: Party-Formatted 108098 |
| | | | Sales-GroupParty 1080100 | | 0..1 1080102 | |
| | | | | InternalID 1080104 | 1 1080106 | PartyInternalID 1080108 |
| | | | | Format-tedName 1080110 | 0..1 1080112 | LONG_Name, Qualifier: Party-Formatted 1080114 |

FIG. 108-4

| Package | level 1 | level 2 | level 3 | level 4 | Cardinality | Datatype Name |
|---|---|---|---|---|---|---|
| SalesTerms 1080116 | | | SalesTerms 1080118 | | 0..1 1080120 | |
| | | | | Distribu-tionChan-nelCode 1080122 | 0..1 1080124 | DistributionChan-nelCode 1080126 |
| | | | | Distribu-tionChan-nelName 1080128 | 0..1 1080130 | MEDIUM_Name, Qualifier: Distribu-tionChannel 1080132 |
| | | | | Division-Code 1080134 | 0..1 1080136 | DivisionCode 1080138 |
| | | | | Division-Name 1080140 | 0..1 1080142 | MEDIUM_Name, Qualifier: Division 1080144 |
| DateTerms 1080146 | | | DateTerms 1080148 | | 0..1 1080150 | |
| | | | | Request-Date 1080152 | 0..1 1080154 | Date 1080156 |

FIG. 108-5

| Package | level 1 | level 2 | level 3 | level 4 | Cardinality | Datatype Name |
|---|---|---|---|---|---|---|
| | | | | Valid-ityStart-Date 1080158 | 1 1080160 | Date 1080162 |
| | | | | Valid-itytEnd-Date 1080164 | 1 1080166 | Date 1080168 |
| TotalValues 1080170 | | | TotalValues 1080172 | | 0..1 1080174 | |
| | | | | NetA-mount 1080176 | 0..1 1080178 | Amount 1080180 |
| Log 1080182 | | Log 1080184 | | | 1 1080186 | Log 1080188 |

FIG. 109

| Package | level 1 | level 2 | level 3 | Cardinality | Datatype Name |
|---|---|---|---|---|---|
| CustomerQuoteBy-IDQueryMes-sage_sync 109000 | CustomerQuoteBy-IDQueryMes-sage_sync 109002 | | | | CustomerQuoteByIDQueryMes-sage_sync 109004 |
| | | | ID 109006 | 1 109008 | BusinessDocumentMessageID 109010 |
| | | | CreationDateTime 109012 | 1 109014 | DateTime 109016 |
| | | | ... | 0..1 | ... |
| Selection 109020 | | Customer-QuoteSelec-tionByID 109022 | | 1 109024 | |
| | | | CustomerQuoteID 109026 | 1 109028 | CustomerQuoteID 109030 |

FIG. 110-1

| Package | level 1 | level 2 | level 3 | level 4 | level 5 | Cardinality | Datatype Name |
|---|---|---|---|---|---|---|---|
| CustomerQuoteByIDResponseMessage_sync 110000 | CustomerQuoteByIDResponseMessage_sync 110002 | | | | | | CustomerQuoteByIDResponseMessage_sync 110004 |
| | | | ID 110006 | | | 1 110008 | BusinessDocumentMessageID 110010 |
| | | | CreationDateTime 110012 | | | 1 110014 | DateTime 110016 |
| | | | ... | | | 0..1 110018 | ... |
| CustomerQuote 110020 | | Customer Quote 110022 | | | | 0..1 110024 | |
| | | | ID 110026 | | | 1 110028 | CustomerQuoteID 110030 |
| | | | Date 110032 | | | 0..1 110034 | Date 110036 |

FIG. 110-2

| Package | level 1 | level 2 | level 3 | level 4 | level 5 | Cardinality | Datatype Name |
|---|---|---|---|---|---|---|---|
| | | | Process-ingType-Code 110038 | | | 0..1 110040 | BusinessTrans-actionDocu-mentProcess-ingTypeCode 110042 |
| | | | BuyerID 110044 | | | 0..1 110046 | BusinessTrans-actionDocumen-tID 110048 |
| | | | StausObject 110050 | | | 0..1 110052 | StatusObject 110054 |
| Party 110056 | | | BuyerParty 110058 | | | 1 110060 | |
| | | | | InternalID 110062 | | 1 110064 | PartyInternalID 110066 |
| | | | | Formatted-Name 110068 | | 0..1 110070 | LONG_Name, Qualifier: Party-Formatted 110072 |
| | | | GoodsRe-cipientParty 110074 | | | 0..1 110076 | |

FIG. 110-3

| Package | level 1 | level 2 | level 3 | level 4 | level 5 | Cardinality | Datatype Name |
|---|---|---|---|---|---|---|---|
| | | | | InternalID 110078 | | 1 110080 | PartyInternalID 110082 |
| | | | | Formatted-Name 110084 | | 0..1 110086 | LONG_Name, Qualifier: Party-Formatted 110088 |
| | | | BillToParty 110090 | | | 0..1 110092 | |
| | | | | InternalID 110094 | | 1 110096 | PartyInternalID 110098 |
| | | | | Formatted-Name 1100100 | | 0..1 1100102 | LONG_Name, Qualifier: Party-Formatted 1100104 |
| | | | PayerParty 1100106 | | | 0..1 1100108 | |
| | | | | InternalID 1100110 | | 1 1100112 | PartyInternalID 1100114 |
| | | | | Formatted-Name 1100116 | | 0..1 1100118 | LONG_Name, Qualifier: Party-Formatted 1100120 |

FIG. 110-4

| Package | level 1 | level 2 | level 3 | level 4 | level 5 | Cardinality | Datatype Name |
|---|---|---|---|---|---|---|---|
| | | | ResponsibleEmployeeParty 1100122 | | | 0..1 1100124 | |
| | | | | InternalID 1100126 | | 1 1100128 | PartyInternalID 1100130 |
| | | | | FormattedName 1100132 | | 0..1 1100134 | LANGUAGEINDEPENDENT_LONG_Name, Qualifier: PersonFormatted 1100136 |
| | | | SalesOrganisationParty 1100138 | | | 1 1100140 | |
| | | | | InternalID 1100142 | | 1 1100144 | PartyInternalID 1100146 |
| | | | SalesOfficeParty 1100148 | | | 0..1 1100150 | |

FIG. 110-5

| Package | level 1 | level 2 | level 3 | level 4 | level 5 | Cardinality | Datatype Name |
|---|---|---|---|---|---|---|---|
| | | | | InternalID 1100152 | | 1 1100154 | PartyInternalID 1100156 |
| | | | Sales-GroupParty 1100158 | | | 0..1 1100160 | |
| | | | | InternalID 1100162 | | 1 1100164 | PartyInternalID 1100166 |
| SalesTerms 1100168 | | | SalesTerms 1100170 | | | 0..1 1100172 | |
| | | | | Distribution-Channel-Code 1100174 | | 0..1 1100176 | Distribution-ChannelCode 1100178 |
| | | | | Division-Code 1100180 | | 0..1 1100182 | DivisionCode 1100184 |
| DateTerms 1100186 | | | DateTerms 1100188 | | | 0..1 1100190 | |
| | | | | RequestDate 1100192 | | 0..1 1100194 | Date 1100196 |

FIG. 110-6

| Package | | | level 1 | level 2 | level 3 | level 4 | level 5 | Cardinality | Datatype Name |
|---|---|---|---|---|---|---|---|---|---|
| | | | | | | ValidityStart-TimePoint-Date 1100198 | | 0..1 1100200 | Date 1100202 |
| | | | | | | ValidityEnd-TimePoint-Date 1100204 | | 0..1 1100206 | Date 1100208 |
| | | PricingTerms 1100210 | | | Pricing-Terms 1100212 | | | 0..1 1100214 | |
| | | | | | | Currency-Code 1100216 | | 0..1 1100218 | CurrencyCode 1100220 |
| | | | | | | PriceDeter-mination-Date 1100222 | | 0..1 1100224 | Date 1100226 |
| | | DeliveryTerms 1100228 | | | Delivery-Terms 1100230 | | | 0..1 1100232 | |

FIG. 110-7

| Package | level 1 | level 2 | level 3 | level 4 | level 5 | Cardinality | Datatype Name |
|---|---|---|---|---|---|---|---|
| | | | | Incoterms 1100234 | | 0..1 1100236 | Incoterms 1100238 |
| InvoiceTerms 1100240 | | | In-voiceTerms 1100242 | | | 0..1 1100244 | |
| | | | | Invoicing-Date 1100246 | | 0..1 1100248 | Date 1100250 |
| TotalValues 1100252 | | | TotalValues 1100254 | | | 0..1 1100256 | |
| | | | | GrossWeight Measure 1100258 | | 0..1 1100260 | Measure 1100262 |
| | | | | NetAmount 1100264 | | 0..1 1100266 | Amount 1100268 |
| Item 1100270 | | | Item 1100272 | | | 0..N 1100274 | |
| | | | | ID 1100276 | | 1 1100278 | Customer-QuoteItemID 1100280 |

FIG. 110-8

| Package | level 1 | level 2 | level 3 | level 4 | level 5 | Cardinality | Datatype Name |
|---|---|---|---|---|---|---|---|
| | | | | Description 1100282 | | 0..1 1100284 | SHORT_Description 1100286 |
| ProductIn-formation 1100288 | | | | Product 1100290 | | 0..1 1100292 | |
| | | | | | SellerID 1100294 | 1 1100296 | ProductPartyID 1100298 |
| Party 1100300 | | | | BuyerParty 1100302 | | 0..1 1100304 | |
| | | | | | InternalID 1100306 | 1 1100308 | PartyInternalID 1100310 |
| | | | | | Formatted-Name 1100312 | 0..1 1100314 | LONG_Name, Qualifier: Party-Formatted 1100316 |
| | | | | GoodsRe-cipientParty 1100318 | | 0..1 1100320 | |
| | | | | | InternalID 1100322 | 1 1100324 | PartyInternalID 1100326 |

FIG. 110-9

| Package | level 1 | level 2 | level 3 | level 4 | level 5 | Cardinality | Datatype Name |
|---|---|---|---|---|---|---|---|
| | | | | | Formatted-Name 1100328 | 0..1 1100330 | LONG_Name, Qualifier: Party-Formatted 1100332 |
| | | | | BillToParty 1100334 | | 0..1 1100336 | |
| | | | | | InternalID 1100338 | 1 1100340 | PartyInternalID 1100342 |
| | | | | | Formatted-Name 1100344 | 0..1 1100346 | LONG_Name, Qualifier: Party-Formatted 1100348 |
| | | | | PayerParty 1100350 | | 0..1 1100352 | |
| | | | | | InternalID 1100354 | 1 1100356 | PartyInternalID 1100358 |
| | | | | | Formatted-Name 1100360 | 0..1 1100362 | LONG_Name, Qualifier: Party-Formatted 1100364 |

FIG. 110-10

| Package | level 1 | level 2 | level 3 | level 4 | level 5 | Cardinality | Datatype Name |
|---|---|---|---|---|---|---|---|
| | | | | ResponsibleEmployeeParty 1100366 | | 0..1 1100368 | |
| | | | | | InternalID 1100370 | 1 1100372 | PartyInternalID 1100374 |
| | | | | | FormattedName 1100376 | 0..1 1100378 | LANGUAGEINDEPENDENT_LONG_Name, Qualifier: PersonFormatted 1100380 |
| Location 1100382 | | | | ShipToLocation 1100384 | | 0..1 1100386 | |
| | | | | | BuyerID 1100388 | 0..1 1100390 | LocationPartyID 1100392 |
| DeliveryTerms 1100394 | | | | DeliveryTerms 1100396 | | 0..1 1100398 | |
| | | | | | Incoterms 1100400 | 0..1 1100402 | Incoterms 1100404 |

FIG. 110-11

| Package | level 1 | level 2 | level 3 | level 4 | level 5 | Cardinality | Datatype Name |
|---|---|---|---|---|---|---|---|
| In-voiceTerms 1100406 | | | | In-voiceTerms 1100408 | | 0..1 1100410 | |
| | | | | | InvoiceDate 1100412 | 0..1 1100414 | Date 1100416 |
| TotalValues 1100418 | | | | TotalValues 1100420 | | 0..1 1100422 | |
| | | | | | Request-edQuantity 1100424 | 0..1 1100426 | Quantity 1100428 |
| | | | | | Confirmed-Quantity 1100430 | 0..1 1100432 | Quantity 1100434 |
| | | | | | GrossWeig htMeasure 1100436 | 0..1 1100438 | Measure 1100440 |
| | | | | | NetWeight-Measure 1100442 | 0..1 1100444 | Measure 1100446 |

FIG. 110-12

| Package | level 1 | level 2 | level 3 | level 4 | level 5 | Cardinality | Datatype Name |
|---|---|---|---|---|---|---|---|
| | | | | | Volume-Measure 1100448 | 0..1 1100450 | Measure 1100452 |
| | | | | | NetAmount 1100454 | 0..1 1100456 | Amount 1100458 |
| | | | | | NetPrice 1100460 | 0..1 1100462 | Price 1100464 |
| Log 1100466 | | Log 1100468 | | | | 1 1100470 | Log 1100472 |

FIG. 111-1

| Package | level 1 | level 2 | level 3 | level 4 | level 5 | Cardinality | Datatype Name |
|---|---|---|---|---|---|---|---|
| CustomerQuote-Message 111000 | Customer-QuoteMessage 111002 | | | | | | CustomerQuote-Message 111004 |
| | | | ID 111006 | | | 1 111008 | BusinessDocu-mentMessageID 111010 |
| | | | Creation-DateTime 111012 | | | 1 111014 | DateTime 111016 |
| | | | … | | | 0..1 | … |
| CustomerQuote 111020 | | Customer-Quote 111022 | | | | 0..N 111024 | |
| | | | ID 111026 | | | 1 111028 | CustomerQuoteID 111030 |
| | | | Date 111032 | | | 0..1 111034 | Date, Qualifier: BusinessTransac-tionDocument 111036 |

FIG. 111-2

| Package | level 1 | level 2 | level 3 | level 4 | level 5 | Cardinality | Datatype Name |
|---|---|---|---|---|---|---|---|
| | | | Processing-TypeCode 111038 | | | 0..1 111040 | BusinessTransactionDocumentProcessingTypeCode 111042 |
| | | | Processing-TypeName 111044 | | | 0..1 111046 | LEN20_Name, Qualifier: Processing Type 111048 |
| | | | BuyerID 111050 | | | 0..1 111052 | BusinessTransactionDocumentID 111054 |
| | | | StausObject 111056 | | | 0..1 111058 | StatusObject 111060 |
| Party 111062 | | | BuyerParty 111064 | | | 1 111066 | |
| | | | | InternalID 111068 | | 1 111070 | PartyInternalID 111072 |
| | | | | Formatted-Name 111074 | | 0..1 111076 | LONG_Name, Qualifier: Party-Formatted 111078 |

FIG. 111-3

| Package | level 1 | level 2 | level 3 | level 4 | level 5 | Cardinality | Datatype Name |
|---|---|---|---|---|---|---|---|
| | | | GoodsRe-cipientParty 111080 | | | 0..1 111082 | |
| | | | | InternalID 111084 | | 1 111086 | PartyInternalID 111088 |
| | | | | Formatted-Name 111090 | | 0..1 111092 | LONG_Name, Qualifier: Party-Formatted 111094 |
| | | | BillToParty 111096 | | | 0..1 111098 | |
| | | | | InternalID 1110100 | | 1 1110102 | PartyInternalID 1110104 |
| | | | | Formatted-Name 1110106 | | 0..1 1110108 | LONG_Name, Qualifier: Party-Formatted 1110110 |
| | | | PayerParty 1110112 | | | 0..1 1110114 | |
| | | | | InternalID 1110116 | | 1 1110118 | PartyInternalID 1110120 |

FIG. 111-4

| Package | level 1 | level 2 | level 3 | level 4 | level 5 | Cardinality | Datatype Name |
|---|---|---|---|---|---|---|---|
| | | | | Formatted-Name 1110122 | | 0..1 1110124 | LONG_Name, Qualifier: Party-Formatted 1110126 |
| | | | Responsi-bleEmploy-eeParty 1110128 | | | 0..1 1110130 | |
| | | | | InternalID 1110132 | | 1 1110134 | PartyInternalID 1110136 |
| | | | | Formatted-Name 1110138 | | 0..1 1110140 | LANGUAGEINDEPENDENT_LONG_Name, Qualifier: Per-sonFormatted 1110142 |
| | | | SalesOrgani-sationParty 1110144 | | | 1 1110146 | |
| | | | | InternalID 1110148 | | 1 1110150 | PartyInternalID 1110152 |

FIG. 111-5

| Package | level 1 | level 2 | level 3 | level 4 | level 5 | Cardinality | Datatype Name |
|---|---|---|---|---|---|---|---|
| | | | | Formatted-Name 1110154 | | 0..1 1110156 | LONG_Name, Qualifier: Party-Formatted 1110158 |
| | | | SalesOffice-Party 1110160 | | | 0..1 1110162 | |
| | | | | InternalID 1110164 | | 1 1110166 | PartyInternalID 1110168 |
| | | | | Formatted-Name 1110170 | | 0..1 1110172 | LONG_Name, Qualifier: Party-Formatted 1110174 |
| | | | SalesGroup-Party 1110176 | | | 0..1 1110178 | |
| | | | | InternalID 1110180 | | 1 1110182 | PartyInternalID 1110184 |
| | | | | Formatted-Name 1110186 | | 0..1 1110188 | LONG_Name, Qualifier: Party-Formatted 1110190 |

FIG. 111-6

| Package | level 1 | level 2 | level 3 | level 4 | level 5 | Cardinality | Datatype Name |
|---|---|---|---|---|---|---|---|
| SalesTerms 1110192 | | | SalesTerms 1110194 | | | 0..1 1110196 | |
| | | | | Distribu-tionChan-nelCode 1110198 | | 0..1 1110200 | DistributionChan-nelCode 1110202 |
| | | | | Distribu-tionChan-nelName 1110204 | | 0..1 1110206 | LEN20_Name, Qualifier: Distribu-tionChannel 1110208 |
| | | | | Division-Code 1110210 | | 0..1 1110212 | DivisionCode 1110214 |
| | | | | Division-Name 1110216 | | 0..1 1110218 | LEN20_Name, Qualifier: Division 1110220 |
| DateTerms 1110222 | | | DateTerms 1110224 | | | 0..1 1110226 | |
| | | | | Request-Date 1110228 | | 0..1 1110230 | Date, Qualifier: Re-quest 1110232 |

FIG. 111-7

| Package | level 1 | level 2 | level 3 | level 4 | level 5 | Cardinality | Datatype Name |
|---|---|---|---|---|---|---|---|
| | | | | Valid-ityStartDate 1110234 | | 0..1 1110236 | Date, Qualifier: ValidityStart 1110238 |
| | | | | Valid-ityEndDate 1110240 | | 0..1 1110242 | Date, Qualifier: ValidityEnd 1110244 |
| PricingTerms 1110246 | | | PricingTerms 1110248 | | | 0..1 1110250 | |
| | | | | Currency-Code 1110252 | | 0..1 1110254 | CurrencyCode 1110256 |
| | | | | PriceDe-termina-tionDate 1110258 | | 0..1 1110260 | Date, Qualifier: PriceDeterimation 1110262 |
| Delivery-Terms 1110264 | | | Delivery-Terms 1110266 | | | 0..1 1110268 | |
| | | | | Incoterms 1110270 | | 0..1 1110272 | Incoterms 1110274 |

FIG. 111-8

| Package | level 1 | level 2 | level 3 | level 4 | level 5 | Cardinality | Datatype Name |
|---|---|---|---|---|---|---|---|
| InvoiceTerms 1110276 | | | InvoiceTerms 1110278 | | | 0..1 1110280 | |
| | | | | Invoicing-Date 1110282 | | 0..1 1110284 | Date, Qualifier: In-voicing 1110286 |
| TotalValues 1110288 | | | TotalValues 1110290 | | | 0..1 1110292 | |
| | | | | GrossWeig htMeasure 1110294 | | 0..1 1110296 | Measure, Qualifier: GrossWeight 1110298 |
| | | | | NetAmount 1110300 | | 0..1 1110302 | Amount, Qualifier: Net 1110304 |
| Item 1110306 | | | Item 1110308 | | | 0..N 1110310 | |
| | | | | ID 1110312 | | 1 1110314 | Customer-QuoteItemID 1110316 |
| | | | | Description 1110318 | | 0..1 1110320 | SHORT_Descriptio n 1110322 |

FIG. 111-9

| Package | level 1 | level 2 | level 3 | level 4 | level 5 | Cardinality | Datatype Name |
|---|---|---|---|---|---|---|---|
| ProductIn-formation 1110324 | | | | Product 1110326 | | 0..1 1110328 | |
| | | | | | SellerID 1110330 | 1 1110332 | ProductPartyID 1110334 |
| Party 1110336 | | | | BuyerParty 1110338 | | 0..1 1110340 | |
| | | | | | InternalID 1110342 | 1 1110344 | PartyInternalID 1110346 |
| | | | | | Formatted-Name 1110348 | 0..1 1110350 | LONG_Name, Qualifier: Party-Formatted 1110352 |
| | | | | GoodsRe-cipientParty 1110354 | | 0..1 1110356 | |
| | | | | | InternalID 1110358 | 1 1110360 | PartyInternalID 1110362 |
| | | | | | Formatted-Name 1110364 | 0..1 1110366 | LONG_Name, Qualifier: Party-Formatted 1110368 |

FIG. 111-10

| Package | level 1 | level 2 | level 3 | level 4 | level 5 | Cardinality | Datatype Name |
|---|---|---|---|---|---|---|---|
| | | | | BillToParty 1110370 | | 0..1 1110372 | |
| | | | | | InternalID 1110374 | 1 1110376 | PartyInternalID 1110378 |
| | | | | | Formatted-Name 1110380 | 0..1 1110382 | LONG_Name, Qualifier: Party-Formatted 1110384 |
| | | | | PayerParty 1110386 | | 0..1 1110388 | |
| | | | | | InternalID 1110390 | 1 1110392 | PartyInternalID 1110394 |
| | | | | | Formatted-Name 1110396 | 0..1 1110398 | LONG_Name, Qualifier: Party-Formatted 1110400 |
| | | | | Responsi-bleEmploy-eeParty 1110402 | | 0..1 1110404 | |

FIG. 111-11

| Package | level 1 | level 2 | level 3 | level 4 | level 5 | Cardinality | Datatype Name |
|---|---|---|---|---|---|---|---|
| | | | | | InternalID 1110406 | 1 1110408 | PartyInternalID 1110410 |
| | | | | | Formatted-Name 1110412 | 0..1 1110414 | LANGUAGEINDEPENDENT_LONG_Name, Qualifier: PersonFormatted 1110416 |
| Location 1110418 | | | | ShipToLocation 1110420 | | 0..1 1110422 | |
| | | | | | BuyerID 1110424 | 0..1 1110426 | LocationPartyID 1110428 |
| DeliveryTerms 1110430 | | | | DeliveryTerms 1110432 | | 0..1 1110434 | |
| | | | | | Incoterms 1110436 | 0..1 1110438 | Incoterms 1110440 |
| InvoiceTerms 1110442 | | | | InvoiceTerms 1110444 | | 0..1 1110446 | |

FIG. 111-12

| Package | level 1 | level 2 | level 3 | level 4 | level 5 | Cardinality | Datatype Name |
|---|---|---|---|---|---|---|---|
| | | | | | InvoiceDate 1110448 | 0..1 1110450 | Date, Qualifier: In-voicing 1110452 |
| TotalVal-ues 1110454 | | | | TotalValues 1110456 | | 0..1 1110458 | |
| | | | | | Request-edQuantity 1110460 | 0..1 1110462 | Quantity, Qualifier: Requested 1110464 |
| | | | | | Confirmed-Quantity 1110466 | 0..1 1110468 | Quantity, Qualifier: Confirmed 1110470 |
| | | | | | GrossWeig htMeasure 1110472 | 0..1 1110474 | Measure, Qualifier: GrossWeight 1110476 |
| | | | | | NetWeight-Measure 1110478 | 0..1 1110480 | Measure, Qualifier: NetWeight 1110482 |
| | | | | | Volume-Measure 1110484 | 0..1 1110486 | Measure, Qualifier: Volume 1110488 |

FIG. 111-13

| Package | level 1 | level 2 | level 3 | level 4 | level 5 | Cardinality | Datatype Name |
|---|---|---|---|---|---|---|---|
| | | | | | NetAmount 1110490 | 0..1 1110492 | Amount, Qualifier: Net 1110494 |
| | | | | | NetPrice 1110496 | 0..1 1110498 | Price, Qualifier: Net 1110500 |
| Log 1110502 | | Log 1110504 | | | | 0..1 1110506 | Log 1110508 |

FIG. 112

| Package | level 1 | level 2 | level 3 | Cardinality | Datatype Name |
|---|---|---|---|---|---|
| CustomerQuoteUser-StatusChangeConfirmationMessage_sync 112000 | CustomerQuoteUser-StatusChangeConfirmationMessage_sync 112002 | | | | CustomerQuoteUser-StatusChangeConfirmationMessage_sync 112004 |
| | | | ID 112006 | 1 112008 | BusinessDocumentMessageID 112010 |
| | | | CreationDateTime 112012 | 1 112014 | DateTime 112016 |
| | | | ... | 0..1 | ... |
| CustomerQuote 112020 | | CustomerQuote 112022 | | 0..1 112024 | |
| | | | ID 112026 | 1 112028 | CustomerQuoteID 112030 |
| | | | StausObject 112032 | 0..1 112034 | StatusObject 112036 |
| Log 112038 | | Log 112040 | | 1 112042 | Log 112044 |

FIG. 113-1

| Package | level 1 | level 2 | level 3 | level 4 | level 5 | Cardinality | Datatype Name |
|---|---|---|---|---|---|---|---|
| CustomerQuoteUser-StatusChangeRequestMessage_sync 113000 | Customer-QuoteUser-StatusChangeRequestMes-sage_sync 113002 | | | | | | CustomerQuoteUs-erStatusChangeRe-questMessage_sync 113004 |
| | | | ID 113006 | | | 1 113008 | BusinessDocument-MessageID 113010 |
| | | | Creation-DateTime 113012 | | | 1 113014 | DateTime 113016 |
| | | | ... | | | 0..1 | ... |
| Customer-Quote 113020 | | Customer-Quote 113022 | | | | 1 113024 | |
| | | | ID 113026 | | | 1 113028 | CustomerQuoteID 113030 |
| | | | StausObject 113032 | | | 1 113034 | |

FIG. 113-2

| Package | level 1 | level 2 | level 3 | level 4 | level 5 | Cardinality | Datatype Name |
|---|---|---|---|---|---|---|---|
| | | | | User-StatusPro-fileCode 113036 | | 1 113038 | UserStatusProfile-Code 113040 |
| | | | | UserStatus 113042 | | 1 113044 | |
| | | | | | Code 113046 | 1 113048 | UserStatusCode 113050 |
| | | | | | ActiveIndi-cator 113052 | 1 113054 | Indicator 113056 |

FIG. 133

| Package | level 1 | level 2 | level 3 | Cardinality | Datatype Name |
|---|---|---|---|---|---|
| CustomerRequirementAvailabilityConfirmationItemByCustomerRequirementExternalRequestItemIDQuery-Message_sync 133000 | CustomerRequirementAvailabilityConfirmationItemByCustomerRequirementExternalRequestItemIDQueryMessage_sync 133002 | | | | CustomerRequirementCreateRequestMessage_sync 133004 |
| Selection 133006 | | CustomerRequirementAvailabilityConfirmationItemByCustomerRequirementExternalRequestItemIDSelection 133008 | | 1 133010 | ... |
| | | | ID 133012 | 1 133014 | BusinessTransactionDocumentID 133016 |
| | | | ExternalRequestItemID 133018 | 1 133020 | BusinessTransactionDocumentItemID 133022 |

FIG. 134-1

| Package | level 1 | level 2 | level 3 | level 4 | level 5 | level 6 | level 7 | Cardinality | Datatype Name |
|---|---|---|---|---|---|---|---|---|---|
| CustomerRequirementAvailabilityConfirmationItemByCustomerRequirementExternalRequestItemIDResponseMessage_sync 134000 | CustomerRequirementAvailabilityConfirmationItemByCustomerRequirementExternal-RequestItemIDResponseMessage_sync 134002 | | | | | | | | CustomerRequirementCreateRequestMessage_sync 134004 |
| CustomerRequirement 134006 | | Customer Requirement 134008 | | | | | | 1 134010 | ... |

FIG. 134-2

| Package | level 1 | level 2 | level 3 | level 4 | level 5 | level 6 | level 7 | Cardinality | Datatype Name |
|---|---|---|---|---|---|---|---|---|---|
| | | | ID 134012 | | | | | 1 134014 | Business-Transac-tion-DocumentID 134016 |
| | | | Syste-mAdmin-istrative-Data 134018 | | | | | 1 134020 | Syste-mAdmin-istrative-Data 134022 |
| External Re-quest 134024 | | | Exter-nalRe-quest 134026 | | | | | 1 134028 | ... 134030 |
| | | | | BaseBusi ness-Transac-tion-Documen tType-Code 134032 | | | | 1 134034 | Business-Transac-tionDocu-mentType Code 134036 |

FIG. 134-3

| Package | level 1 | level 2 | level 3 | level 4 | level 5 | level 6 | level 7 | Cardinality | Datatype Name |
|---|---|---|---|---|---|---|---|---|---|
| Business-Transac-tionDocu-mentRefer-ence 134038 | | | | BaseBusi ness-Transac-tionDocu-men-tRefer-ence 134040 | | | | 0..1 134042 | ... 134044 |
| | | | | | ID 134046 | | | 1 134048 | Business-Transac-tionDocu-mentID 134050 |
| Item 134052 | | | | Item 134054 | | | | 1..n 134056 | ... 134058 |

FIG. 134-4

| Package | level 1 | level 2 | level 3 | level 4 | level 5 | level 6 | level 7 | Cardinality | Datatype Name |
|---|---|---|---|---|---|---|---|---|---|
| | | | | | ProductAvailabilityRequirement-ConfirmationItemUUID 134060 | | | 1 134062 | UUID 134064 |
| | | | | | ID 134066 | | | 1 134068 | BusinessTransaction-DocumentItemID 134070 |
| | | | | | Supply-PlanningAreaID 134072 | | | 0..1 134074 | Supply-PlanningAreaID 134076 |

FIG. 134-5

| Package | level 1 | level 2 | level 3 | level 4 | level 5 | level 6 | level 7 | Cardinality | Datatype Name |
|---|---|---|---|---|---|---|---|---|---|
| | | | | | BaseBusiness-Transaction-DocumentItem-Type-Code 134078 | | | 0..1 134080 | Business-TransactionDocumentItem-Type-Code 134082 |
| | | | | | Distribution-Channel Code 134084 | | | 0..1 134086 | Distribution-Channel-Code 134088 |
| | | | | | Division-Code 134090 | | | 0..1 134092 | Division-Code 134094 |

FIG. 134-6

| Package | level 1 | level 2 | level 3 | level 4 | level 5 | level 6 | level 7 | Cardinality | Datatype Name |
|---|---|---|---|---|---|---|---|---|---|
| | | | | | LogisticsExecution-BlockingReasonCode 134096 | | | 0..1 134098 | BlockingReasonCode 1340100 |
| | | | | | CancellationReasonCode 1340102 | | | 0..1 1340104 | CancellationReasonCode 1340106 |
| ProductInformation 1340108 | | | | | Product 1340110 | | | 1 1340112 | ... 1340114 |
| | | | | | | InternalID 1340116 | | 1 1340118 | ProductInternalID 1340120 |
| | | | | | | SellerID 1340122 | | 0..1 1340124 | ProductPartyID 1340126 |
| | | | | | | BuyerID 1340128 | | 0..1 1340130 | ProductPartyID 1340132 |

FIG. 134-7

| Package | level 1 | level 2 | level 3 | level 4 | level 5 | level 6 | level 7 | Cardinality | Datatype Name |
|---|---|---|---|---|---|---|---|---|---|
| | | | | | | Identified StockID 1340134 | | 0..1 1340136 | Identi-fiedStockI D 1340138 |
| Party 1340140 | | | | | Buyer-Party 1340142 | | | 0..1 1340144 | ... 1340146 |
| | | | | | | ID 1340148 | | 1 1340150 | PartyID 1340152 |
| | | | | | Seller-Party 1340154 | | | 0..1 1340156 | ... 1340158 |
| | | | | | | ID 1340160 | | 1 1340162 | PartyID 1340164 |
| | | | | | Produc-tRecipi-entParty 1340166 | | | 0..1 1340168 | ... 1340170 |
| | | | | | | ID 1340172 | | 1 1340174 | PartyID 1340176 |

FIG. 134-8

| Package | level 1 | level 2 | level 3 | level 4 | level 5 | level 6 | level 7 | Cardinality | Datatype Name |
|---|---|---|---|---|---|---|---|---|---|
| Location 1340178 | | | | | Ship-ToLocation 1340180 | | | 0..1 1340182 | ... 1340184 |
| | | | | | | BuyerID 1340186 | | 0..1 1340188 | Location-PartyID 1340190 |
| | | | | | | SellerID 1340192 | | 0..1 1340194 | Location-PartyID 1340196 |
| | | | | | Ship-FromLocation 1340198 | | | 0..1 1340200 | ... 1340202 |
| | | | | | | BuyerID 1340204 | | 0..1 1340206 | Location-PartyID 1340208 |
| | | | | | | SellerID 1340210 | | 0..1 1340212 | Location-PartyID 1340214 |

FIG. 134-9

| Package | level 1 | level 2 | level 3 | level 4 | level 5 | level 6 | level 7 | Cardinality | Datatype Name |
|---|---|---|---|---|---|---|---|---|---|
| GroupInformation 1340216 | | | | | Group 1340218 | | | 0..1 1340220 | ... 1340222 |
| | | | | | | ID 1340224 | | 1 1340226 | BusinessTransactionDocumentItemGroupID 1340228 |
| | | | | | | HierarchyRelationshipTypeCode 1340230 | | 0..1 1340232 | BusinessTransactionDocumentItemHierarchyRelationshipTypeCode 1340234 |

FIG. 134-10

| Package | level 1 | level 2 | level 3 | level 4 | level 5 | level 6 | level 7 | Cardinality | Datatype Name |
|---|---|---|---|---|---|---|---|---|---|
| Properties 1340236 | | | | | Property 1340238 | | | 0..n 1340240 | ... 1340242 |
| | | | | | | ID 1340244 | | 1 1340246 | PropertyID 1340248 |
| | | | | | | Value 1340250 | | 1 1340252 | PropertyValue 1340254 |
| DeliveryInformation 1340256 | | | | | DeliveryTerms 1340258 | | | 0..1 1340260 | ... 1340262 |
| | | | | | | PriorityCode 1340264 | | 0..1 1340266 | PriorityCode 1340268 |
| | | | | | | Incoterms 1340270 | | 0..1 1340272 | Incoterms 1340274 |

FIG. 134-11

| Package | level 1 | level 2 | level 3 | level 4 | level 5 | level 6 | level 7 | Cardinality | Datatype Name |
|---|---|---|---|---|---|---|---|---|---|
| | | | | | | Partial-Deliv-eryMaxi-mum-Number-Value 1340276 | | 0..1 1340278 | Number-Value 1340280 |
| | | | | | | Quantity-Toler-ance 1340282 | | 0..1 1340284 | Quantity-Tolerance 1340286 |
| | | | | | | Partial-Delivery-Control-Code 1340288 | | 0..1 1340290 | PartialDe-liveryCon-trolCode 1340292 |
| Trans-portation 1340294 | | | | | Transpor-tation-Terms 1340296 | | | 0..1 1340298 | ... 1340300 |

FIG. 134-12

| Package | level 1 | level 2 | level 3 | level 4 | level 5 | level 6 | level 7 | Cardinality | Datatype Name |
|---|---|---|---|---|---|---|---|---|---|
| | | | | | | TransportServiceLevelCode 1340302 | | 0..1 1340304 | TransportServiceLevelCode 1340306 |
| BusinessTransactionDocumentItemReference 1340308 | | | | | BaseBusinessTransactionDocumentItemReference 1340310 | | | 0..1 1340312 | ... 1340314 |
| | | | | | | BusinessTransactionDocumentItemReference 1340316 | | 1 1340318 | BusinessTransactionDocumentReference 1340320 |

FIG. 134-13

| Package | level 1 | level 2 | level 3 | level 4 | level 5 | level 6 | level 7 | Cardinality | Datatype Name |
|---|---|---|---|---|---|---|---|---|---|
| Sched-uleLine 1340322 | | | | | Sched-uleLine 1340324 | | | 1..n 1340326 | ... 1340328 |
| | | | | | | ID 1340330 | | 1 1340332 | Business-Transac-tionDocu-mentItem-Sched-uleLineID 1340334 |
| | | | | | | Quantity 1340336 | | 1 1340338 | Quantity 1340340 |

FIG. 134-14

| Package | level 1 | level 2 | level 3 | level 4 | level 5 | level 6 | level 7 | Cardinality | Datatype Name |
|---|---|---|---|---|---|---|---|---|---|
| | | | | | | Time-Segment 1340342 | | 1..n 1340344 | ... 1340346 |
| | | | | | | | DateTime Period 1340348 | 1 1340350 | UPPEROPEN_GLOBAL_DateTimePeriod 1340352 |
| | | | | | | | Pe-riodRole-Code 1340354 | 1 1340356 | Pe-riodRole-Code 1340358 |

FIG. 134-15

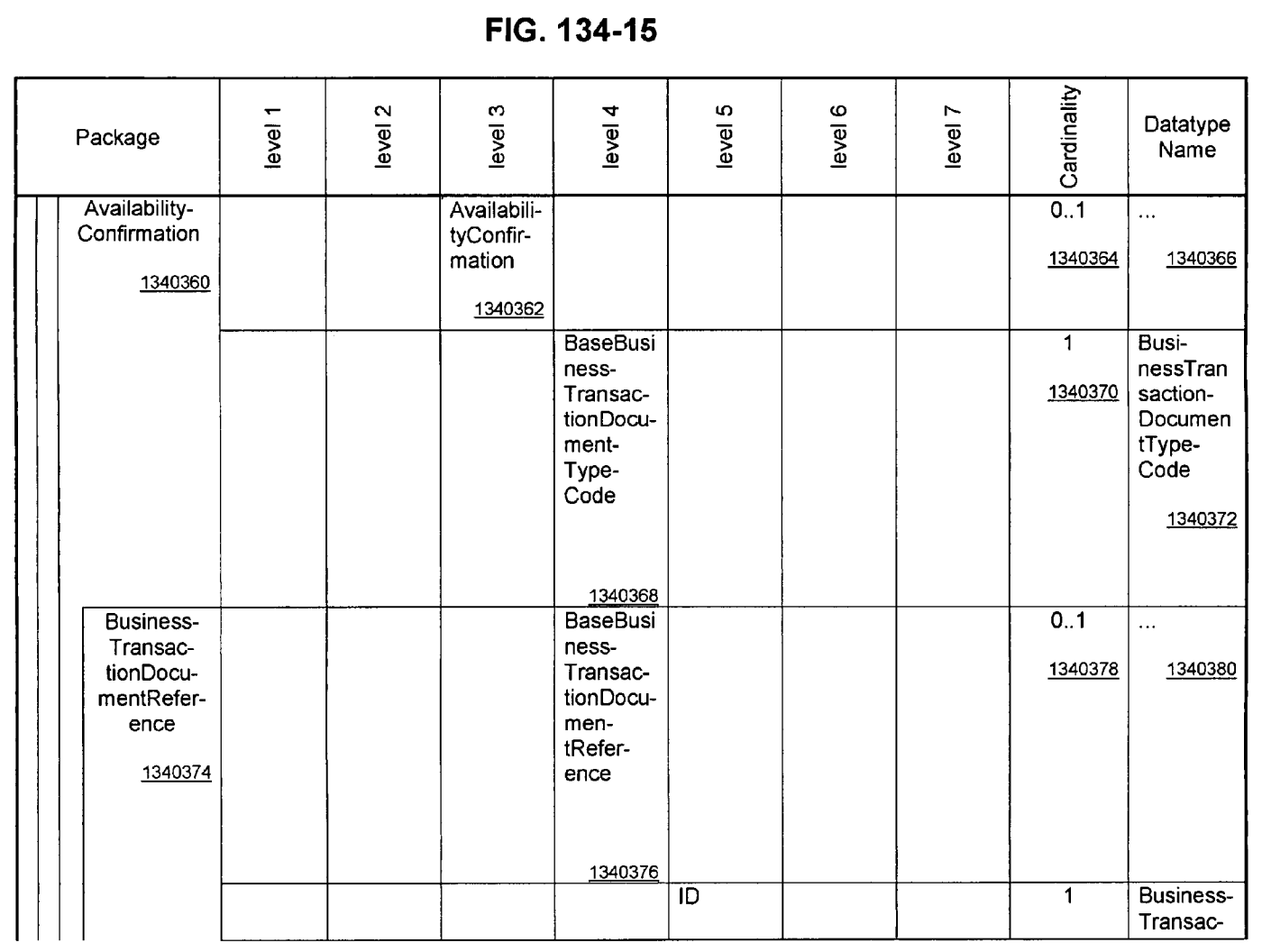

| Package | level 1 | level 2 | level 3 | level 4 | level 5 | level 6 | level 7 | Cardinality | Datatype Name |
|---|---|---|---|---|---|---|---|---|---|
| Availability-Confirmation 1340360 | | | Availabili-tyConfir-mation 1340362 | | | | | 0..1 1340364 | ... 1340366 |
| | | | | BaseBusi ness-Transac-tionDocu-ment-Type-Code 1340368 | | | | 1 1340370 | Busi-nessTran saction-Documen tType-Code 1340372 |
| Business-Transac-tionDocu-mentRefer-ence 1340374 | | | | BaseBusi ness-Transac-tionDocu-men-tRefer-ence 1340376 | | | | 0..1 1340378 | ... 1340380 |
| | | | | | ID | | | 1 | Business-Transac- |

FIG. 134-16

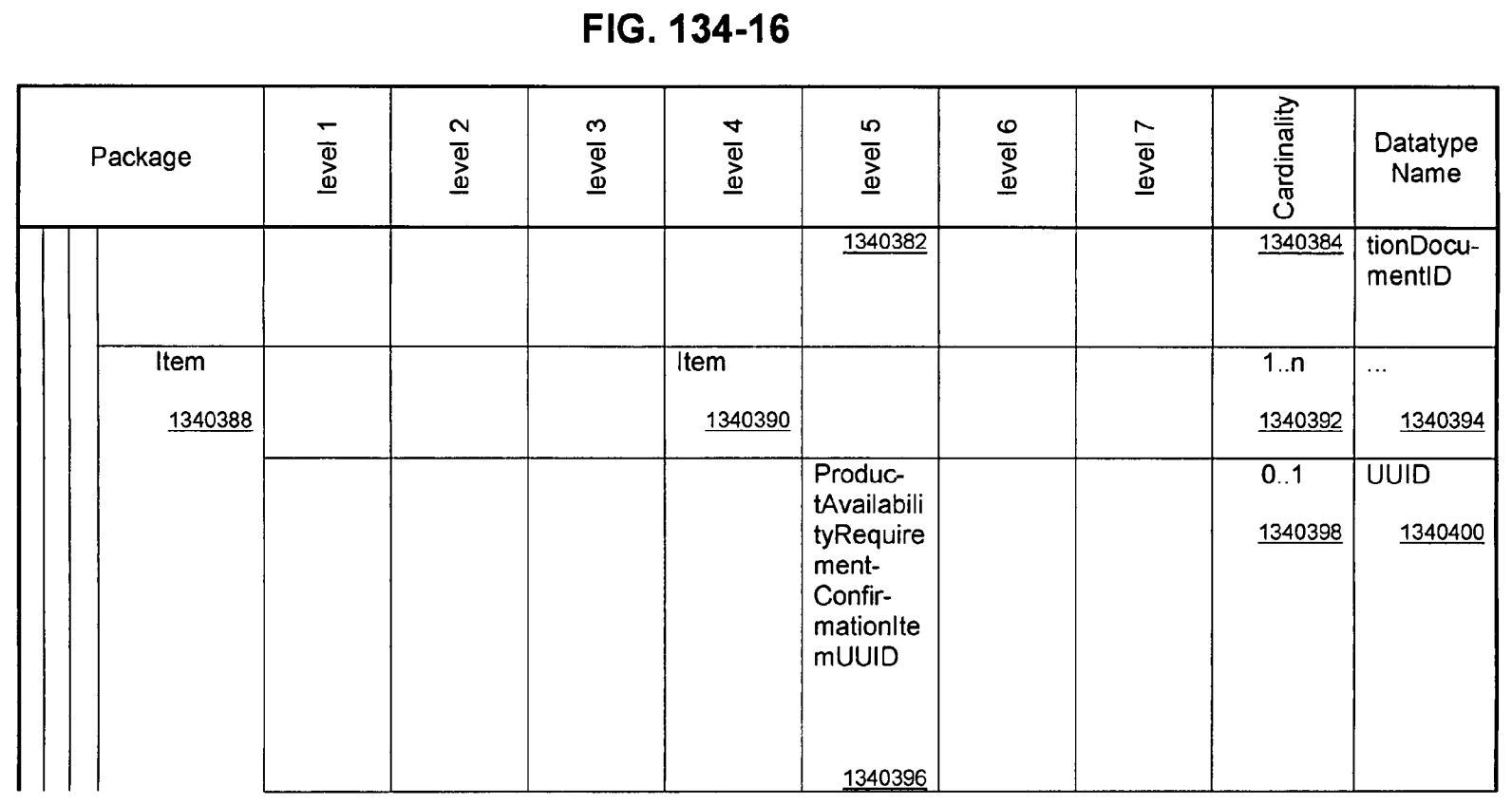

| Package | level 1 | level 2 | level 3 | level 4 | level 5 | level 6 | level 7 | Cardinality | Datatype Name |
|---|---|---|---|---|---|---|---|---|---|
| | | | | | 1340382 | | | 1340384 | tionDocu-mentID |
| Item 1340388 | | | | Item 1340390 | | | | 1..n 1340392 | ... 1340394 |
| | | | | | Produc-tAvailabilityRequire ment-Confir-mationItemUUID 1340396 | | | 0..1 1340398 | UUID 1340400 |

FIG. 134-17

| Package | level 1 | level 2 | level 3 | level 4 | level 5 | level 6 | level 7 | Cardinality | Datatype Name |
|---|---|---|---|---|---|---|---|---|---|
| | | | | | ID 1340402 | | | 1 1340404 | Busi-nessTransaction-DocumentItemID 1340406 |
| | | | | | BaseBusiness-Transac-tion-DocumentItem-Type-Code 1340408 | | | 0..1 1340410 | Busi-nessTransaction-DocumentItemTypeCode 1340412 |

FIG. 134-18

| Package | level 1 | level 2 | level 3 | level 4 | level 5 | level 6 | level 7 | Cardinality | Datatype Name |
|---|---|---|---|---|---|---|---|---|---|
| | | | | | Syste-mAdmin-istrative-Data 1340414 | | | 1 1340416 | Syste-mAdmin-istrative-Data 1340418 |
| | | | | | Supply-Plannin-gAreaID 1340420 | | | 0..1 1340422 | Supply-Plannin-gAreaID 1340424 |
| | | | | | Exter-nalRe-questIte-mUUID 1340426 | | | 1 1340428 | UUID 1340430 |
| Product-Informa-tion 1340432 | | | | | Product 1340434 | | | 1 1340436 | ... 1340438 |
| | | | | | | InternalID 1340440 | | 1 1340442 | Product-InternalID 1340444 |
| | | | | | | SellerID | | 0..1 | Product-PartyID |

FIG. 134-19

| Package | level 1 | level 2 | level 3 | level 4 | level 5 | level 6 | level 7 | Cardinality | Datatype Name |
|---|---|---|---|---|---|---|---|---|---|
| | | | | | | 1340446 | | 1340448 | 1340450 |
| | | | | | | BuyerID 1340452 | | 0..1 1340454 | Product-PartyID 1340456 |
| | | | | | | Identified StockID 1340458 | | 0..1 1340460 | Identified-StockID 1340462 |
| Location 1340464 | | | | | Ship-FromLo-cation 1340466 | | | 1 1340468 | ... 1340470 |
| | | | | | | BuyerID 1340472 | | 0..1 1340474 | Location-PartyID 1340476 |
| | | | | | | SellerID 1340478 | | 0..1 1340480 | Location-PartyID 1340482 |
| | | | | | Group | | | 0..1 | ... |

FIG. 134-20

| Package | level 1 | level 2 | level 3 | level 4 | level 5 | level 6 | level 7 | Cardinality | Datatype Name |
|---|---|---|---|---|---|---|---|---|---|
| GroupInformation 1340484 | | | | | 1340486 | | | 1340488 | 1340490 |
| | | | | | | ID 1340492 | | 1 1340494 | BusinessTransaction-DocumentItemGroupID 1340496 |
| | | | | | | HierarchyRelationship-Type-Code 1340498 | | 0..1 1340500 | BusinessTransaction-DocumentItemHierarchyRelationship-Type-Code 1340502 |
| BusinessTransactionDocumentItemReference | | | | | BaseBusiness-Transaction-DocumentItem-Reference | | | 0..1 1340508 | ... 1340510 |

FIG. 134-21

| Package | level 1 | level 2 | level 3 | level 4 | level 5 | level 6 | level 7 | Cardinality | Datatype Name |
|---|---|---|---|---|---|---|---|---|---|
| 1340504 | | | | | 1340506 | | | | |
| | | | | | | BusinessTransaction-DocumentItem-Reference 1340512 | | 1 1340514 | BusinessTransaction-DocumentReference 1340516 |
| | | | | | Out-bound-DeliveryReference 1340518 | | | 0..1 1340520 | ... 1340522 |

FIG. 134-22

| Package | level 1 | level 2 | level 3 | level 4 | level 5 | level 6 | level 7 | Cardinality | Datatype Name |
|---|---|---|---|---|---|---|---|---|---|
| | | | | | | Business Transac-tion-Documen tItem-Refer-ence 1340524 | | 1 1340526 | Busi-nessTran saction-Documen tRefer-ence 1340528 |
| Sched-uleLine 1340530 | | | | | Sched-uleLine 1340532 | | | 1..n 1340534 | ... 1340536 |
| | | | | | | ID 1340538 | | 1 1340540 | Business-Transac-tion-Documen tItem-Sched-uleLineID 1340542 |
| | | | | | | Quantity 1340544 | | 1 1340546 | Quantity 1340548 |

FIG. 134-23

| Package | level 1 | level 2 | level 3 | level 4 | level 5 | level 6 | level 7 | Cardinality | Datatype Name |
|---|---|---|---|---|---|---|---|---|---|
| | | | | | | Time-Segment 1340550 | | 1..n 1340552 | ... 1340554 |
| | | | | | | | DateTime Period 1340556 | 1 1340558 | UPPEROPEN_GLOBAL_DateTimePeriod 1340560 |
| | | | | | | | Pe-riodRole-Code 1340562 | 1 1340564 | Pe-riodRole-Code 1340566 |
| Log 1340568 | | Log 1340570 | | | | | | 1 1340572 | Log 1340574 |

FIG. 135-1

| Package | level 1 | level 2 | level 3 | level 4 | level 5 | Cardinality | Datatype Name |
|---|---|---|---|---|---|---|---|
| CustomerRequirementAvailabilityConfirmationItemCancelRequestMessage_sync 135000 | CustomerRequirementAvailabilityConfirmationItemCancelRequestMessage_sync 135002 | | | | | | CustomerRequirementCreateRequestMessage_sync 135004 |
| CustomerRequirement 135006 | | CustomerRequirement 135008 | | | | 1 135010 | ... |
| | | | ID 135012 | | | 1 135014 | BusinessTransactionDocumentID 135016 |
| AvailabilityConfirmation 135018 | | | AvailabilityConfirmation 135020 | | | 1 135022 | ... 135024 |

FIG. 135-2

| Package | level 1 | level 2 | level 3 | level 4 | level 5 | Cardinality | Datatype Name |
|---|---|---|---|---|---|---|---|
| | | | | BaseBusiness-Transaction-Document-TypeCode 135026 | | 1 135028 | Business-Transac-tionDocu-ment-TypeCode 135030 |
| Item 135032 | | | | Item 135034 | | 1 135036 | ... 135038 |
| | | | | | ID 135040 | 1 135042 | Business-Transac-tionDocu-men-tItemID 135044 |

FIG. 136-1

| Package | level 1 | level 2 | level 3 | level 4 | level 5 | level 6 | level 7 | Cardinality | Datatype Name |
|---|---|---|---|---|---|---|---|---|---|
| CustomerRequirementAvailabilityConfirmationitem-ChangeRequest-Message_sync 136000 | CustomerRequirementAvailabilityConfirmationitemChangeRequestMessage_sync 136002 | | | | | | | | Customer-RequirementCreateRequestMessage_sync 136004 |
| CustomerRequirement 136006 | | CustomerRequirement 136008 | | | | | | 1 136010 | ... |
| | | | ID 136012 | | | | | 1 136014 | BusinessTransactionDocumentID 136016 |

FIG. 136-2

| Package | level 1 | level 2 | level 3 | level 4 | level 5 | level 6 | level 7 | Cardinality | Datatype Name |
|---|---|---|---|---|---|---|---|---|---|
| | | | Syste-mAd-ministra-tiveData 136018 | | | | | 1 136020 | Syste-mAdminis-trativeData 136022 |
| AvailabilityCon-firmation 136024 | | | Avail-ability-Confir-mation 136026 | | | | | 0..1 136028 | ... 136030 |
| | | | | Base-Busi-ness-Transac-tionDocu ment-Type-Code 136032 | | | | 1 136034 | Business-Transac-tionDocu-mentType-Code 136036 |

FIG. 136-3

| Package | level 1 | level 2 | level 3 | level 4 | level 5 | level 6 | level 7 | Cardinality | Datatype Name |
|---|---|---|---|---|---|---|---|---|---|
| BusinessTransactionDocumentReference 136038 | | | | BaseBusinessTransactionDocumentReference 136040 | | | | 0..1 136042 | ... 136044 |
| | | | | | ID 136046 | | | 1 136048 | BusinessTransactionDocumentID 136050 |
| Item 136052 | | | | Item 136054 | | | | 1 136056 | ... 136058 |

FIG. 136-4

| Package | level 1 | level 2 | level 3 | level 4 | level 5 | level 6 | level 7 | Cardinality | Datatype Name |
|---|---|---|---|---|---|---|---|---|---|
| | | | | | ProductAvailabilityRequirementConfirmationItemUUID 136060 | | | 0..1 136062 | UUID 136064 |
| | | | | | ID 136066 | | | 1 136068 | BusinessTransactionDocumentItemID 136070 |
| | | | | | BaseBusinessTransactionDocumentItemTypeCode 136072 | | | 0..1 136074 | BusinessTransactionDocumentItemTypeCode 136076 |

FIG. 136-5

| Package | level 1 | level 2 | level 3 | level 4 | level 5 | level 6 | level 7 | Cardinality | Datatype Name |
|---|---|---|---|---|---|---|---|---|---|
| | | | | | Syste-mAdminis-trative-Data 136078 | | | 1 136080 | Syste-mAdminis-trativeData 136082 |
| | | | | | Supply-Plannin-gAreaID 136084 | | | 0..1 136086 | Supply-PlanningA-reaID 136088 |
| | | | | | External-Reques-tItemUUID 136090 | | | 1 136092 | UUID 136094 |
| ProductIn-formation 136096 | | | | | Product 136098 | | | 1 1360100 | ... 1360102 |
| | | | | | | InternalID 1360104 | | 1 1360106 | Product-InternalID 1360108 |
| | | | | | | SellerID 1360110 | | 0..1 1360112 | Product-PartyID 1360114 |

FIG. 136-6

| Package | level 1 | level 2 | level 3 | level 4 | level 5 | level 6 | level 7 | Cardinality | Datatype Name |
|---|---|---|---|---|---|---|---|---|---|
| | | | | | | BuyerID 1360116 | | 0..1 1360118 | Product-PartyID 1360120 |
| | | | | | | Identi-fiedStockID 1360122 | | 0..1 1360124 | Identified-StockID 1360126 |
| Location 1360128 | | | | | Ship-FromLo-cation 1360130 | | | 1 1360132 | ... 1360134 |
| | | | | | | BuyerID 1360136 | | 0..1 1360138 | Location-PartyID 1360140 |
| | | | | | | SellerID 1360142 | | 0..1 1360144 | Location-PartyID 1360146 |
| GroupIn-formation 1360148 | | | | | Group 1360150 | | | 0..1 1360152 | ... 1360154 |

FIG. 136-7

| Package | level 1 | level 2 | level 3 | level 4 | level 5 | level 6 | level 7 | Cardinality | Datatype Name |
|---|---|---|---|---|---|---|---|---|---|
| | | | | | | ID 1360156 | | 1 1360158 | BusinessTransactionDocumentItemGroupID 1360160 |
| | | | | | | HierarchyRelationshipTypeCode 1360162 | | 0..1 1360164 | BusinessTransactionDocumentItemHierarchyRelationshipTypeCode 1360166 |
| BusinessTransactionDocumentItemReference 1360168 | | | | | BaseBusinessTransactionDocumentItemReference 1360170 | | | 0..1 1360172 | ... 1360174 |

FIG. 136-8

| Package | level 1 | level 2 | level 3 | level 4 | level 5 | level 6 | level 7 | Cardinality | Datatype Name |
|---|---|---|---|---|---|---|---|---|---|
| | | | | | | Business-Transac-tion-Documen-tItem-Reference 1360176 | | 1 1360178 | Business-Transac-tionDocu-mentRefer-ence 1360180 |
| | | | | | Out-boundDe-liv-eryRefer-ence 1360182 | | | 0..1 1360184 | ... 1360186 |
| | | | | | | Business-Transac-tion-Documen-tItem-Reference 1360188 | | 1 1360190 | Business-Transac-tionDocu-mentRefer-ence 1360192 |
| Sched-uleLine 1360194 | | | | | Sched-uleLine 1360196 | | | 1..n 1360198 | ... 1360200 |

FIG. 136-9

| Package | level 1 | level 2 | level 3 | level 4 | level 5 | level 6 | level 7 | Cardinality | Datatype Name |
|---|---|---|---|---|---|---|---|---|---|
| | | | | | | ID 1360202 | | 1 1360204 | Business-Transac-tionDocu-mentItem-Sched-uleLineID 1360206 |
| | | | | | | Quantity 1360208 | | 1 1360210 | Quantity 1360212 |
| | | | | | | Time-Segment 1360214 | | 1..n 1360216 | ... 1360218 |
| | | | | | | | DateTime Period 1360220 | 1 1360222 | UPPEROPEN_GLOBAL_DateTimePeriod 1360224 |
| | | | | | | | Pe-riodRole-Code 1360226 | 1 1360228 | PeriodRole Code 1360230 |

FIG. 137-1

| Package | level 1 | level 2 | level 3 | level 4 | level 5 | Cardinality | Datatype Name |
|---|---|---|---|---|---|---|---|
| CustomerRequirementAvailability-Confirmationitem-ConfirmationMessage_sync 137000 | CustomerRequirementAvailability-ConfirmationItem-ConfirmationMessage_sync 137002 | | | | | | CustomerRequirementCreateRequestMessage_sync 137004 |
| CustomerRequirement 137006 | | Customer-Requirement 137008 | | | | 1 137010 | ... |
| | | | ID 137012 | | | 1 137014 | BusinessTransactionDocumentID 137016 |
| Availability-Confirmation 137018 | | | Availability-Confirmation 137020 | | | 1 137022 | ... 137024 |
| | | | | BaseBusiness-Transaction-Document-TypeCode 137026 | | 1 137028 | BusinessTransactionDocumentTypeCode 137030 |
| Item 137032 | | | | Item 137034 | | 1 137036 | ... 137038 |

FIG. 137-2

| Package | level 1 | level 2 | level 3 | level 4 | level 5 | Cardinality | Datatype Name |
|---|---|---|---|---|---|---|---|
| | | | | | ID 137040 | 1 137042 | BusinessTrans-actionDocumen-tItemID 137044 |
| Log 137046 | | Log 137048 | | | | 1 137050 | Log 137052 |

FIG. 138-1

| Package | level 1 | level 2 | level 3 | level 4 | level 5 | level 6 | level 7 | Cardinality | Datatype Name |
|---|---|---|---|---|---|---|---|---|---|
| CustomerRequirementAvailabilityConfirmationitemCreateRequestMessage_sync 138000 | CustomerRequirementAvailabilityConfirmationitemCreateRequestMessage_sync 138002 | | | | | | | | CustomerRequirementCreateRequestMessage_sync 138004 |
| CustomerRequirement 138006 | | Customer Requirement 138008 | | | | | | 1 138010 | … |
| | | | ID 138012 | | | | | 1 138014 | BusinessTransactionDocumentID 138016 |

FIG. 138-2

| Package | level 1 | level 2 | level 3 | level 4 | level 5 | level 6 | level 7 | Cardinality | Datatype Name |
|---|---|---|---|---|---|---|---|---|---|
| | | | Syste-mAdmin-istrative-Data 138018 | | | | | 1 138020 | Syste-mAdminis-trative-Data 138022 |
| AvailabilityCon-firmation 138024 | | | Availabili-tyConfir-mation 138026 | | | | | 0..1 138028 | ... 138030 |
| | | | | BaseBusi ness-Transac-tion-Documen tType-Code 138032 | | | | 1 138034 | Business-Transac-tion-Document TypeCode 138036 |

FIG. 138-3

| Package | level 1 | level 2 | level 3 | level 4 | level 5 | level 6 | level 7 | Cardinality | Datatype Name |
|---|---|---|---|---|---|---|---|---|---|
| Business-Transac-tionDocu-mentRefer-ence 138038 | | | | BaseBusi ness-Transac-tionDocu-men-tRefer-ence 138040 | | | | 0..1 138042 | ... 138044 |
| | | | | | ID 138046 | | | 1 138048 | Business-Transac-tion-Documen-tID 138050 |
| Item 138052 | | | | Item 138054 | | | | 1 138056 | ... 138058 |
| | | | | | | | | 0..1 138062 | UUID 138064 |

FIG. 138-4

| Package | level 1 | level 2 | level 3 | level 4 | level 5 | level 6 | level 7 | Cardinality | Datatype Name |
|---|---|---|---|---|---|---|---|---|---|
| | | | | | ID 138066 | | | 1 138068 | Business-Transaction-DocumentItemID 138070 |
| | | | | | Base-Business-Transaction-DocumentItem-TypeCode 138072 | | | 0..1 138074 | Business-Transaction-DocumentItem-TypeCode 138076 |
| | | | | | SystemAdministrative-Data 138078 | | | 1 138080 | SystemAdministrative-Data 138082 |
| | | | | | Supply-PlanningAreaID 138084 | | | 0..1 138086 | Supply-PlanningAreaID 138088 |

FIG. 138-5

| Package | level 1 | level 2 | level 3 | level 4 | level 5 | level 6 | level 7 | Cardinality | Datatype Name |
|---|---|---|---|---|---|---|---|---|---|
| | | | | | External-RequestItemUUID 138090 | | | 1 138092 | UUID 138094 |
| ProductInformation 138096 | | | | | Product 138098 | | | 1 1380100 | ... 1380102 |
| | | | | | | InternalID 1380104 | | 1 1380106 | Product-InternalID 1380108 |
| | | | | | | SellerID 1380110 | | 0..1 1380112 | Product-PartyID 1380114 |
| | | | | | | BuyerID 1380116 | | 0..1 1380118 | Product-PartyID 1380120 |
| | | | | | | Identi-fiedStockID 1380122 | | 0..1 1380124 | Identi-fiedStockID 1380126 |

FIG. 138-6

| Package | level 1 | level 2 | level 3 | level 4 | level 5 | level 6 | level 7 | Cardinality | Datatype Name |
|---|---|---|---|---|---|---|---|---|---|
| Location 1380128 | | | | | Ship-FromLocation 1380130 | | | 1 1380132 | ... 1380134 |
| | | | | | | BuyerID 1380136 | | 0..1 1380138 | Location-PartyID 1380140 |
| | | | | | | SellerID 1380142 | | 0..1 1380144 | Location-PartyID 1380146 |
| GroupInformation 1380148 | | | | | Group 1380150 | | | 0..1 1380152 | ... 1380154 |
| | | | | | | ID 1380156 | | 1 1380158 | Business-Transaction-DocumentItem-GroupID 1380160 |

FIG. 138-7

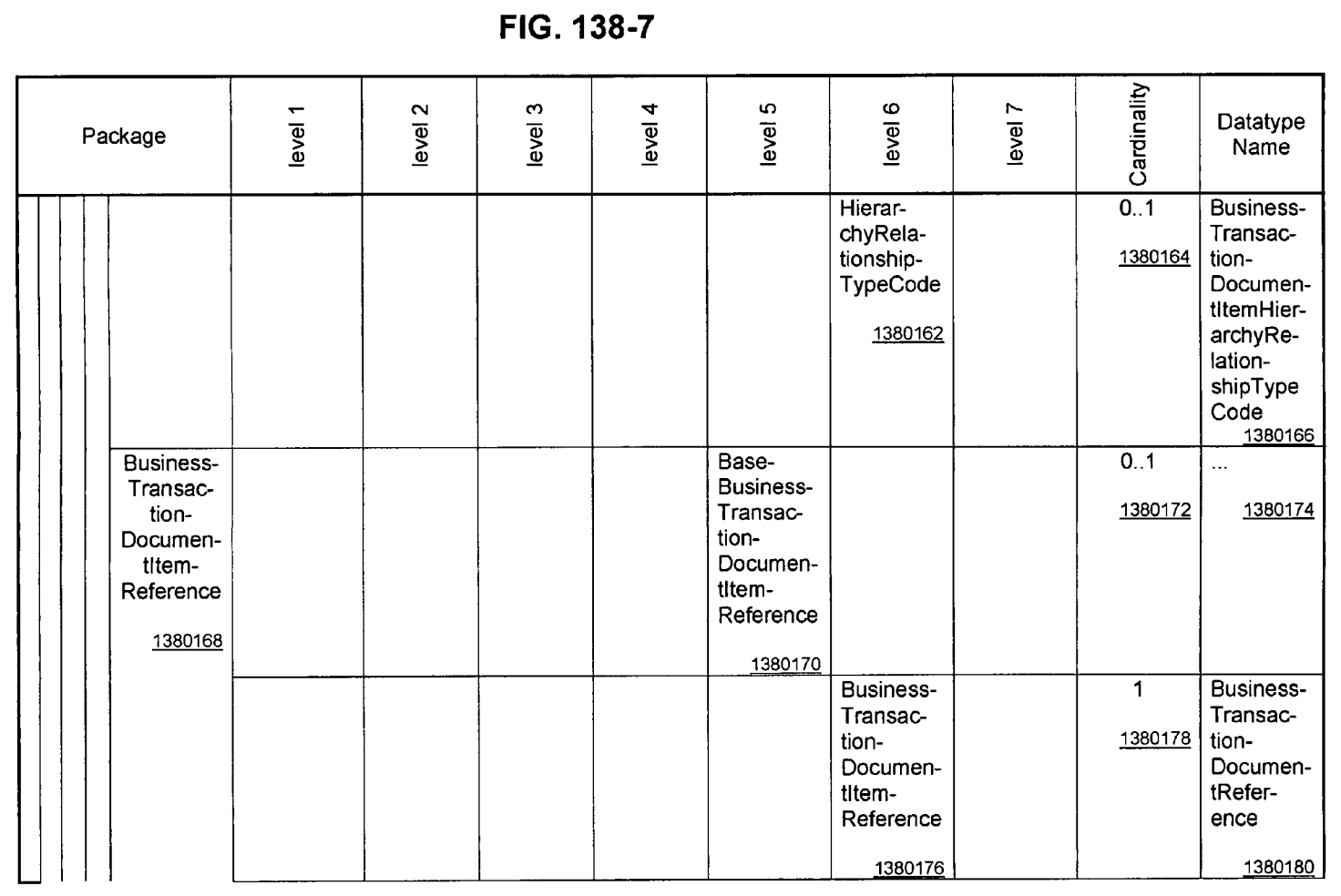

| Package | level 1 | level 2 | level 3 | level 4 | level 5 | level 6 | level 7 | Cardinality | Datatype Name |
|---|---|---|---|---|---|---|---|---|---|
| | | | | | | Hierar-chyRela-tionship-TypeCode 1380162 | | 0..1 1380164 | Business-Transac-tion-Documen-tItemHier-archyRe-lation-shipType Code 1380166 |
| Business-Transac-tion-Documen-tItem-Reference 1380168 | | | | | Base-Business-Transac-tion-Documen-tItem-Reference 1380170 | | | 0..1 1380172 | ... 1380174 |
| | | | | | | Business-Transac-tion-Documen-tItem-Reference 1380176 | | 1 1380178 | Business-Transac-tion-Documen-tRefer-ence 1380180 |

FIG. 138-8

| Package | level 1 | level 2 | level 3 | level 4 | level 5 | level 6 | level 7 | Cardinality | Datatype Name |
|---|---|---|---|---|---|---|---|---|---|
| | | | | | Out-boundDe-liv-eryRefer-ence 1380182 | | | 0..1 1380184 | ... 1380186 |
| | | | | | | Business-Transac-tion-Documen-tItem-Reference 1380188 | | 1 1380190 | Business-Transac-tion-Documen-tRefer-ence 1380192 |
| Sched-uleLine 1380194 | | | | | Sched-uleLine 1380196 | | | 1..n 1380198 | ... 1380200 |
| | | | | | | ID 1380202 | | 1 1380204 | Business-Transac-tion-Documen-tItem-Sched-uleLineID 1380206 |

FIG. 138-9

| Package | level 1 | level 2 | level 3 | level 4 | level 5 | level 6 | level 7 | Cardinality | Datatype Name |
|---|---|---|---|---|---|---|---|---|---|
| | | | | | | Quantity 1380208 | | 1 1380210 | Quantity 1380212 |
| | | | | | | Time-Segment 1380214 | | 1..n 1380216 | ... 1380218 |
| | | | | | | | DateTime Period 1380220 | 1 1380222 | UPPEROPEN_GLOBAL_DateTimePe-riod 1380224 |
| | | | | | | | Pe-riodRole-Code 1380226 | 1 1380228 | Pe-riodRole-Code 1380230 |

FIG. 139

| Package | level 1 | level 2 | level 3 | Cardinality | Datatype Name |
| --- | --- | --- | --- | --- | --- |
| CustomerRequirementByIDQueryMessage_sync 139000 | CustomerRequirementByIDQuery-Message_sync 139002 | | | | CustomerRequirementByIDQueryMessage_sync 139004 |
| Selection 139006 | | CustomerRequirementSelectionByID 139008 | | 1 139010 | … |
| | | | ID 139012 | 1 139014 | BusinessTransaction-DocumentID 139016 |

FIG. 140-1

| Package | level 1 | level 2 | level 3 | level 4 | level 5 | level 6 | level 7 | Cardinality | Datatype Name |
|---|---|---|---|---|---|---|---|---|---|
| CustomerRequirementByIDResponseMessage_sync 140000 | CustomerRequirementByIDResponseMessage_sync 140002 | | | | | | | | CustomerRequirementByIDResponseMessage_sync 140004 |
| CustomerRequirement 140006 | | CustomerRequirement 140008 | | | | | | 1 140010 | ... |
| | | | ID 140012 | | | | | 1 140014 | BusinessTransactionDocumentID 140016 |
| | | | SystemAdministrativeData 140018 | | | | | 1 140020 | SystemAdministrativeData 140022 |

FIG. 140-2

| Package | level 1 | level 2 | level 3 | level 4 | level 5 | level 6 | level 7 | Cardinality | Datatype Name |
|---|---|---|---|---|---|---|---|---|---|
| External Request 140024 | | | External-Request 140026 | | | | | 1 140028 | ... 140030 |
| | | | | Base-Business-TransactionDocument-TypeCode 140032 | | | | 1 140034 | Business-Transaction-Document-TypeCode 140036 |
| Business-TransactionDocumentReference 140038 | | | | Base-Business-Transaction-DocumentReference 140040 | | | | 0..1 140042 | ... 140044 |

FIG. 140-3

| Package | level 1 | level 2 | level 3 | level 4 | level 5 | level 6 | level 7 | Cardinality | Datatype Name |
|---|---|---|---|---|---|---|---|---|---|
| | | | | | ID 140046 | | | 1 140048 | Business-Transaction-DocumentID 140050 |
| Item 140052 | | | | Item 140054 | | | | 1..n 140056 | ... 140058 |
| | | | | | ProductA-vailabili-tyRequire-mentCon-firmatio-nIte-mUUID 140060 | | | 0..1 140062 | UUID 140064 |
| | | | | | ID 140066 | | | 1 140068 | Business-Transaction-Documen-tItemID 140070 |

FIG. 140-4

| Package | level 1 | level 2 | level 3 | level 4 | level 5 | level 6 | level 7 | Cardinality | Datatype Name |
|---|---|---|---|---|---|---|---|---|---|
| | | | | | Supply-Plannin-gAreaID 140072 | | | 0..1 140074 | SupplyPlan-ningAreaID 140076 |
| | | | | | Base-Business-Transac-tion-Documen-tItem-TypeCode 140078 | | | 0..1 140080 | Business-Transaction-Documen-tItemType-Code 140082 |
| | | | | | Distribu-tionChan-nelCode 140084 | | | 0..1 140086 | Distribution-ChannelCode 140088 |
| | | | | | Division-Code 140090 | | | 0..1 140092 | DivisionCode 140094 |

FIG. 140-5

| Package | level 1 | level 2 | level 3 | level 4 | level 5 | level 6 | level 7 | Cardinality | Datatype Name |
|---|---|---|---|---|---|---|---|---|---|
| | | | | | LogisticsExecutionBlockingReasonCode 140096 | | | 0..1 140098 | BlockingReasonCode 1400100 |
| | | | | | CancellationReasonCode 1400102 | | | 0..1 1400104 | CancellationReasonCode 1400106 |
| ProductInformation 1400108 | | | | | Product 1400110 | | | 1 1400112 | ... 1400114 |
| | | | | | | InternalID 1400116 | | 1 1400118 | ProductInternalID 1400120 |
| | | | | | | SellerID 1400122 | | 0..1 1400124 | ProductPartyID 1400126 |
| | | | | | | BuyerID 1400128 | | 0..1 1400130 | ProductPartyID 1400132 |

FIG. 140-6

| Package | level 1 | level 2 | level 3 | level 4 | level 5 | level 6 | level 7 | Cardinality | Datatype Name |
|---|---|---|---|---|---|---|---|---|---|
| | | | | | | Identi-fiedStockID 1400134 | | 0..1 1400136 | Identified-StockID 1400138 |
| Party 1400140 | | | | | Buyer-Party 1400142 | | | 0..1 1400144 | ... 1400146 |
| | | | | | | ID 1400148 | | 1 1400150 | PartyID 1400152 |
| | | | | | Seller-Party 1400154 | | | 0..1 1400156 | ... 1400158 |
| | | | | | | ID 1400160 | | 1 1400162 | PartyID 1400164 |
| | | | | | Produc-tRecipi-entParty 1400166 | | | 0..1 1400168 | ... 1400170 |
| | | | | | | ID 1400172 | | 1 1400174 | PartyID 1400176 |

FIG. 140-7

| Package | level 1 | level 2 | level 3 | level 4 | level 5 | level 6 | level 7 | Cardinality | Datatype Name |
|---|---|---|---|---|---|---|---|---|---|
| Location 1400178 | | | | | Ship-ToLocation 1400180 | | | 0..1 1400182 | ... 1400184 |
| | | | | | | BuyerID 1400186 | | 0..1 1400188 | Location-PartyID 1400190 |
| | | | | | | SellerID 1400192 | | 0..1 1400194 | Location-PartyID 1400196 |
| | | | | | Ship-FromLocation 1400198 | | | 0..1 1400200 | ... 1400202 |
| | | | | | | BuyerID 1400204 | | 0..1 1400206 | Location-PartyID 1400208 |
| | | | | | | SellerID 1400210 | | 0..1 1400212 | Location-PartyID 1400214 |
| GroupInformation | | | | | Group 1400218 | | | 0..1 1400220 | ... 1400222 |

FIG. 140-8

| Package | level 1 | level 2 | level 3 | level 4 | level 5 | level 6 | level 7 | Cardinality | Datatype Name |
|---|---|---|---|---|---|---|---|---|---|
| 1400216 | | | | | | ID 1400224 | | 1 140022 6 | Business-Transaction-DocumentItemGroupID 1400228 |
| | | | | | | HierarchyRelationship-TypeCode 1400230 | | 0..1 140023 2 | Business-Transaction-DocumentItemHierarchyRelationshipTypeCode 1400234 |
| Properties 1400236 | | | | | Property 1400238 | | | 0..n 140024 0 | ... 1400242 |
| | | | | | | ID 1400244 | | 1 140024 6 | PropertyID 1400248 |
| | | | | | | Value 1400250 | | 1 140025 2 | PropertyValue 1400254 |
| Delivery-Information | | | | | Delivery-Terms 1400258 | | | 0..1 140026 0 | ... 1400262 |

FIG. 140-9

| Package | level 1 | level 2 | level 3 | level 4 | level 5 | level 6 | level 7 | Cardinality | Datatype Name |
|---|---|---|---|---|---|---|---|---|---|
| 1400256 | | | | | | Priority-Code 1400264 | | 0..1 1400266 | PriorityCode 1400268 |
| | | | | | | Incoterms 1400270 | | 0..1 1400272 | Incoterms 1400274 |
| | | | | | | PartialDeliveryMaximumNumberValue 1400276 | | 0..1 1400278 | NumberValue 1400280 |
| | | | | | | Quantity-Tolerance 1400282 | | 0..1 1400284 | QuantityTolerance 1400286 |
| | | | | | | PartialDeliveryControlCode 1400288 | | 0..1 1400290 | PartialDeliveryControlCode 1400292 |
| Transportation 1400294 | | | | | Transportation-Terms | | | 0..1 1400298 | ... 1400300 |

FIG. 140-10

| Package | level 1 | level 2 | level 3 | level 4 | level 5 | level 6 | level 7 | Cardinality | Datatype Name |
|---|---|---|---|---|---|---|---|---|---|
| | | | | | 1400296 | | | | |
| | | | | | | Trans-portSer-viceLevel-Code 1400302 | | 0..1 1400304 | TransportSer-viceLevelCode 1400306 |
| Business-Transac-tion-Documen-tItem-Reference 1400308 | | | | | Base-Business-Transac-tion-Documen-tItem-Reference 1400310 | | | 0..1 1400312 | ... 1400314 |
| | | | | | | Business-Transac-tion-Documen-tItem-Reference 1400316 | | 1 1400318 | Business-Transaction-Documen-tReference 1400320 |
| Sched-uleLine | | | | | Sched-uleLine | | | 1..n 14003 | ... 1400328 |

FIG. 140-11

| Package | level 1 | level 2 | level 3 | level 4 | level 5 | level 6 | level 7 | Cardinality | Datatype Name |
|---|---|---|---|---|---|---|---|---|---|
| 1400322 | | | | | 1400324 | | | 26 | |
| | | | | | | ID 1400330 | | 1 1400332 | Business-Transaction-DocumentItemSchedule-LineID 1400334 |
| | | | | | | Quantity 1400336 | | 1 1400338 | Quantity 1400340 |
| | | | | | | Time-Segment 1400342 | | 1..n 1400344 | ... 1400346 |
| | | | | | | | DateTime Period 1400348 | 1 1400350 | UPPEROPEN_GLOBAL_DateTimePeriod 1400352 |
| | | | | | | | PeriodRole-Code 1400354 | 1 1400356 | PeriodRole-Code 1400358 |

FIG. 140-12

| Package | level 1 | level 2 | level 3 | level 4 | level 5 | level 6 | level 7 | Cardinality | Datatype Name |
|---|---|---|---|---|---|---|---|---|---|
| AvailabilityConfirmation 1400360 | | | AvailabilityConfirmation 1400362 | | | | | 0..1 1400364 | ... 1400366 |
| | | | | Base-Business-Transaction-DocumentTypeCode 1400368 | | | | 1 1400370 | Business-Transaction-Document-TypeCode 1400372 |
| BusinessTransactionDocumentReference 1400374 | | | | Base-Business-Transaction-DocumentReference 1400376 | | | | 0..1 1400378 | ... 1400380 |
| | | | | | ID 1400382 | | | 1 1400384 | Business-Transaction-DocumentID 1400386 |
| Item | | | | Item | | | | 1..n | ... |

FIG. 140-13

| Package | level 1 | level 2 | level 3 | level 4 | level 5 | level 6 | level 7 | Cardinality | Datatype Name |
|---|---|---|---|---|---|---|---|---|---|
| 1400388 | | | | 1400390 | | | | 1400392 | 1400394 |
| | | | | | ProductAvailabilityRequirement ConfirmationItemUUID 1400396 | | | 0..1 1400398 | UUID 1400400 |
| | | | | | ID 1400402 | | | 1 1400404 | BusinessTransactionDocumentItemID 1400406 |

FIG. 140-14

| Package | level 1 | level 2 | level 3 | level 4 | level 5 | level 6 | level 7 | Cardinality | Datatype Name |
|---|---|---|---|---|---|---|---|---|---|
| | | | | | Base-Business-Transaction-DocumentItem-TypeCode 1400408 | | | 0..1 1400410 | Business-Transaction-DocumentItemType-Code 1400412 |
| | | | | | SystemAdministrative-Data 1400414 | | | 1 1400416 | SystemAdministrativeData 1400418 |
| | | | | | Supply-PlanningAreaID 1400420 | | | 0..1 1400422 | SupplyPlanningAreaID 1400424 |
| | | | | | External-RequestItemUUID 1400426 | | | 1 1400428 | UUID 1400430 |

FIG. 140-15

| Package | level 1 | level 2 | level 3 | level 4 | level 5 | level 6 | level 7 | Cardinality | Datatype Name |
|---|---|---|---|---|---|---|---|---|---|
| ProductIn-formation 1400432 | | | | | Product 1400434 | | | 1 1400436 | ... 1400438 |
| | | | | | | InternalID 1400440 | | 1 1400442 | ProductInter-nalID 1400444 |
| | | | | | | SellerID 1400446 | | 0..1 1400448 | ProductPartyID 1400450 |
| | | | | | | BuyerID 1400452 | | 0..1 1400454 | ProductPartyID 1400456 |
| | | | | | | Identi-fiedStockID 1400458 | | 0..1 1400460 | Identified-StockID 1400462 |
| Location 1400464 | | | | | Ship-FromLo-cation 1400466 | | | 1 1400468 | ... 1400470 |
| | | | | | | BuyerID 1400472 | | 0..1 14004 | Location-PartyID |

FIG. 140-16

| Package | level 1 | level 2 | level 3 | level 4 | level 5 | level 6 | level 7 | Cardinality | Datatype Name |
|---|---|---|---|---|---|---|---|---|---|
| | | | | | | | | 74 | 1400476 |
| | | | | | | SellerID 1400478 | | 0..1 1400480 | Location-PartyID 1400482 |
| GroupInformation 1400484 | | | | | Group 1400486 | | | 0..1 1400488 | ... 1400490 |
| | | | | | | ID 1400492 | | 1 1400494 | BusinessTransactionDocumentItemGroupID 1400496 |
| | | | | | | HierarchyRelationshipTypeCode 1400498 | | 0..1 1400500 | BusinessTransactionDocumentItemHierarchyRelationshipTypeCode 1400502 |

FIG. 140-17

| Package | level 1 | level 2 | level 3 | level 4 | level 5 | level 6 | level 7 | Cardinality | Datatype Name |
|---|---|---|---|---|---|---|---|---|---|
| Business-Transaction-DocumentItem-Reference 1400504 | | | | | Base-Business-Transaction-DocumentItem-Reference 1400506 | | | 0..1 1400508 | ... 1400510 |
| | | | | | | Business-Transaction-DocumentItem-Reference 1400512 | | 1 1400514 | Business-Transaction-DocumentReference 1400516 |
| | | | | | Out-boundDeliveryReference 1400518 | | | 0..1 1400520 | ... 1400522 |

FIG. 140-18

| Package | level 1 | level 2 | level 3 | level 4 | level 5 | level 6 | level 7 | Cardinality | Datatype Name |
|---|---|---|---|---|---|---|---|---|---|
| | | | | | | Business-Transaction-DocumentItem-Reference 1400524 | | 1 1400526 | Business-Transaction-DocumentReference 1400528 |
| ScheduleLine 1400530 | | | | | ScheduleLine 1400532 | | | 1..n 1400534 | ... 1400536 |
| | | | | | | ID 1400538 | | 1 1400540 | Business-Transaction-DocumentItemScheduleLineID 1400542 |
| | | | | | | Quantity 1400544 | | 1 1400546 | Quantity 1400548 |
| | | | | | | Time-Segment 1400550 | | 1..n 1400552 | ... 1400554 |

FIG. 140-19

| Package | level 1 | level 2 | level 3 | level 4 | level 5 | level 6 | level 7 | Cardinality | Datatype Name |
|---|---|---|---|---|---|---|---|---|---|
| | | | | | | | DateTime Period 1400556 | 1 1400558 | UPPEROPEN_GLOBAL_DateTimePeriod 1400560 |
| | | | | | | | Pe-riodRole-Code 1400562 | 1 1400564 | PeriodRole-Code 1400566 |
| Log 1400568 | | Log 1400570 | | | | | | 1 1400572 | Log 1400574 |

FIG. 141

| Package | level 1 | level 2 | level 3 | Cardinality | Datatype Name |
|---|---|---|---|---|---|
| CustomerRequirementCancelRequestMessage_sync 141000 | CustomerRequirementCancelRequestMessage_sync 141002 | | | | CustomerRequirementCancelRequestMessage_sync 141006 |
| CustomerRequirement 141008 | | Customer Requirement 141010 | | 1 141012 | … |
| | | | ID 141016 | 1 141018 | BusinessTransactionDocumentID 141022 |

FIG. 142-1

| Package | level 1 | level 2 | level 3 | level 4 | level 5 | level 6 | level 7 | Cardinality | Datatype Name |
|---|---|---|---|---|---|---|---|---|---|
| CustomerRequire-mentChangeRe-questMessage_sync 142000 | Customer Require-mentCha ngeRe-questMes sage_syn c 142002 | | | | | | | | CustomerRe-quire-mentChangeR equestMes-sage_sync 142004 |
| CustomerRequire-ment 142006 | | Cus-tomerRe quireme nt 142008 | | | | | | 1 142010 | ... |
| | | | ID 142012 | | | | | 1 142014 | Business-Transaction-DocumentID 142016 |
| | | | Syste-mAdminis-trative-Data 142018 | | | | | 1 142020 | SystemAdmin-istrativeData 142022 |

FIG. 142-2

| Package | level 1 | level 2 | level 3 | level 4 | level 5 | level 6 | level 7 | Cardinality | Datatype Name |
|---|---|---|---|---|---|---|---|---|---|
| External Request 142024 | | | External-Request 142026 | | | | | 1 142028 | ... 142030 |
| | | | | Base-Business-TransactionDocument-TypeCode 142032 | | | | 1 142034 | Business-Transaction-Document-TypeCode 142036 |
| Business-Transaction-DocumentReference 142038 | | | | Base-Business-Transaction-DocumentReference 142040 | | | | 0..1 142042 | ... 142044 |
| | | | | | ID 142046 | | | 1 142048 | Business-Transaction-DocumentID 142050 |

FIG. 142-3

| Package | level 1 | level 2 | level 3 | level 4 | level 5 | level 6 | level 7 | Cardinality | Datatype Name |
|---|---|---|---|---|---|---|---|---|---|
| Item 142052 | | | | Item 142054 | | | | 1..n 142056 | ... 142058 |
| | | | | | ProductAvailabilityRequirementConfirmationItemUUID 142060 | | | 0..1 142062 | UUID 142064 |
| | | | | | ID 142066 | | | 1 142068 | BusinessTransactionDocumentItemID 142070 |
| | | | | | SupplyPlanningAreaID 142072 | | | 0..1 142074 | SupplyPlanningAreaID 142076 |

FIG. 142-4

| Package | level 1 | level 2 | level 3 | level 4 | level 5 | level 6 | level 7 | Cardinality | Datatype Name |
|---|---|---|---|---|---|---|---|---|---|
| | | | | | BaseBusinessTransaction-DocumentItem-Type-Code 142078 | | | 0..1 142080 | Business-Transaction-DocumentItemType-Code 142082 |
| | | | | | Distribution-ChannelCode 142084 | | | 0..1 142086 | Distribution-ChannelCode 142088 |
| | | | | | Division-Code 142090 | | | 0..1 142092 | DivisionCode 142094 |
| | | | | | Logistics-ExecutionBlocking-ReasonCode 142096 | | | 0..1 142098 | BlockingReasonCode 1420100 |

FIG. 142-5

| Package | level 1 | level 2 | level 3 | level 4 | level 5 | level 6 | level 7 | Cardinality | Datatype Name |
|---|---|---|---|---|---|---|---|---|---|
| | | | | | CancellationReasonCode 1420102 | | | 0..1 1420104 | CancellationReasonCode 1420106 |
| ProductInformation 1420108 | | | | | Product 1420110 | | | 1 1420112 | ... 1420114 |
| | | | | | | InternalID 1420116 | | 1 1420118 | ProductInternalID 1420120 |
| | | | | | | SellerID 1420122 | | 0..1 1420124 | ProductPartyID 1420126 |
| | | | | | | BuyerID 1420128 | | 0..1 1420130 | ProductPartyID 1420132 |
| | | | | | | IdentifiedStockID 1420134 | | 0..1 1420136 | IdentifiedStockID 1420138 |

FIG. 142-6

| Package | level 1 | level 2 | level 3 | level 4 | level 5 | level 6 | level 7 | Cardinality | Datatype Name |
|---|---|---|---|---|---|---|---|---|---|
| Party 1420140 | | | | | Buyer-Party 1420142 | | | 0..1 1420144 | ... 1420146 |
| | | | | | | ID 1420148 | | 1 1420150 | PartyID 1420152 |
| | | | | | Seller-Party 1420154 | | | 0..1 1420156 | ... 1420158 |
| | | | | | | ID 1420160 | | 1 1420162 | PartyID 1420164 |
| | | | | | Produc-tRecipi-entParty 1420166 | | | 0..1 1420168 | ... 1420170 |
| | | | | | | ID 1420172 | | 1 1420174 | PartyID 1420176 |

FIG. 142-7

| Package | level 1 | level 2 | level 3 | level 4 | level 5 | level 6 | level 7 | Cardinality | Datatype Name |
|---|---|---|---|---|---|---|---|---|---|
| Location 1420178 | | | | | Ship-ToLocation 1420180 | | | 0..1 1420182 | ... 1420184 |
| | | | | | | BuyerID 1420186 | | 0..1 1420188 | Location-PartyID 1420190 |
| | | | | | | SellerID 1420192 | | 0..1 1420194 | Location-PartyID 1420196 |
| | | | | | Ship-FromLocation 1420198 | | | 0..1 1420200 | ... 1420202 |
| | | | | | | BuyerID 1420204 | | 0..1 1420206 | Location-PartyID 1420208 |
| | | | | | | SellerID 1420210 | | 0..1 1420212 | Location-PartyID 1420214 |

FIG. 142-8

| Package | level 1 | level 2 | level 3 | level 4 | level 5 | level 6 | level 7 | Cardinality | Datatype Name |
|---|---|---|---|---|---|---|---|---|---|
| GroupInformation 1420216 | | | | | Group 1420218 | | | 0..1 1420220 | ... 1420222 |
| | | | | | | ID 1420224 | | 1 1420226 | BusinessTransactionDocumentItemGroupID 1420228 |
| | | | | | | HierarchyRelationshipTypeCode 1420230 | | 0..1 1420232 | BusinessTransactionDocumentItemHierarchyRelationshipTypeCode 1420234 |
| Properties 1420236 | | | | | Property 1420238 | | | 0..n 1420240 | ... 1420242 |
| | | | | | | ID 1420244 | | 1 1420246 | PropertyID 1420248 |
| | | | | | | Value 1420250 | | 1 1420252 | PropertyValue 1420254 |

FIG. 142-9

| Package | level 1 | level 2 | level 3 | level 4 | level 5 | level 6 | level 7 | Cardinality | Datatype Name |
|---|---|---|---|---|---|---|---|---|---|
| DeliveryIn-formation 1420256 | | | | | Delivery-Terms 1420258 | | | 0..1 1420260 | ... 1420262 |
| | | | | | | Priority-Code 1420264 | | 0..1 1420266 | PriorityCode 1420268 |
| | | | | | | Incoterms 1420270 | | 0..1 1420272 | Incoterms 1420274 |
| | | | | | | Partial-DeliveryMaximum-Number-Value 1420276 | | 0..1 1420278 | NumberValue 1420280 |
| | | | | | | Quantity-Toler-ance 1420282 | | 0..1 1420284 | QuantityToler-ance 1420286 |

FIG. 142-10

| Package | level 1 | level 2 | level 3 | level 4 | level 5 | level 6 | level 7 | Cardinality | Datatype Name |
|---|---|---|---|---|---|---|---|---|---|
| | | | | | | Partial-Delivery-Control-Code 1420288 | | 0..1 1420290 | PartialDeliveryControl-Code 1420292 |
| Transportation 1420294 | | | | | Transportation-Terms 1420296 | | | 0..1 1420298 | ... 1420300 |
| | | | | | | Trans-portServiceLevel Code 1420302 | | 0..1 1420304 | TransportServiceLevelCode 1420306 |
| Business-TransactionDocumentItem-Reference 1420308 | | | | | BaseBusiness-TransactionDocumentItem Reference 1420310 | | | 0..1 1420312 | ... 1420314 |

FIG. 142-11

| Package | level 1 | level 2 | level 3 | level 4 | level 5 | level 6 | level 7 | Cardinality | Datatype Name |
|---|---|---|---|---|---|---|---|---|---|
| | | | | | | BusinessTransactionDocumentItemReference 1420316 | | 1 1420318 | BusinessTransactionDocumentReference 1420320 |
| ScheduleLine 1420322 | | | | | ScheduleLine 1420324 | | | 1..n 1420326 | ... 1420328 |
| | | | | | | ID 1420330 | | 1 1420332 | BusinessTransactionDocumentItemScheduleLineID 1420334 |
| | | | | | | Quantity 1420336 | | 1 1420338 | Quantity 1420340 |
| | | | | | | TimeSegment | | 1..n 14203 | ... 1420346 |

FIG. 142-12

| Package | level 1 | level 2 | level 3 | level 4 | level 5 | level 6 | level 7 | Cardinality | Datatype Name |
|---|---|---|---|---|---|---|---|---|---|
| | | | | | | 1420342 | | 44 | |
| | | | | | | | DateTime Period 1420348 | 1 1420350 | UPPEROPEN _GLOBAL_DateTimePeriod 1420352 |
| | | | | | | | PeriodRoleCode 1420354 | 1 1420356 | PeriodRoleCode 1420358 |
| AvailabilityConfirmation 1420360 | | | AvailabilityConfirmation 1420362 | | | | | 0..1 1420364 | ... 1420366 |
| | | | | BaseBusinessTransactionDocumentTypeCode 1420368 | | | | 1 1420370 | BusinessTransactionDocumentTypeCode 1420372 |

FIG. 142-13

| Package | level 1 | level 2 | level 3 | level 4 | level 5 | level 6 | level 7 | Cardinality | Datatype Name |
|---|---|---|---|---|---|---|---|---|---|
| Business-Transaction-Documen-tReference 1420374 | | | | Base-Business-Transac-tion-Documen-tRefer-ence 1420376 | | | | 0..1 1420378 | ... 1420380 |
| | | | | | ID 1420382 | | | 1 1420384 | Business-Transaction-DocumentID 1420386 |
| Item 1420388 | | | | Item 1420390 | | | | 1..n 1420392 | ... 1420394 |
| | | | | | Produc-tAvailabil-ityRe-quire-mentCon-firmatio-nIte-mUUID 1420396 | | | 0..1 1420398 | UUID 1420400 |

FIG. 142-14

| Package | level 1 | level 2 | level 3 | level 4 | level 5 | level 6 | level 7 | Cardinality | Datatype Name |
| --- | --- | --- | --- | --- | --- | --- | --- | --- | --- |
| | | | | | ID 1420402 | | | 1 1420404 | Business-Transaction-DocumentItemID 1420406 |
| | | | | | BaseBusinessTransaction-DocumentItem-Type-Code 1420408 | | | 0..1 1420410 | Business-Transaction-DocumentItemType-Code 1420412 |
| | | | | | SystemAdmin-istrative-Data 1420414 | | | 1 1420416 | SystemAdmin-istrativeData 1420418 |
| | | | | | Supply-PlanningAreaID 1420420 | | | 0..1 1420422 | SupplyPlan-ningAreaID 1420424 |

FIG. 142-15

| Package | level 1 | level 2 | level 3 | level 4 | level 5 | level 6 | level 7 | Cardinality | Datatype Name |
|---|---|---|---|---|---|---|---|---|---|
| | | | | | External-Reques-tIte-mUUID 1420426 | | | 1 1420428 | UUID 1420430 |
| ProductIn-formation 1420432 | | | | | Product 1420434 | | | 1 1420436 | ... 1420438 |
| | | | | | | InternalID 1420440 | | 1 1420442 | ProductInter-nalID 1420444 |
| | | | | | | SellerID 1420446 | | 0..1 1420448 | Product-PartyID 1420450 |
| | | | | | | BuyerID 1420452 | | 0..1 1420454 | Product-PartyID 1420456 |
| | | | | | | Identi-fiedStockID 1420458 | | 0..1 1420460 | Identified-StockID 1420462 |

FIG. 142-16

| Package | level 1 | level 2 | level 3 | level 4 | level 5 | level 6 | level 7 | Cardinality | Datatype Name |
|---|---|---|---|---|---|---|---|---|---|
| Location 1420464 | | | | | Ship-FromLo-cation 1420466 | | | 1 1420468 | ... 1420470 |
| | | | | | | BuyerID 1420472 | | 0..1 1420474 | Location-PartyID 1420476 |
| | | | | | | SellerID 1420478 | | 0..1 1420480 | Location-PartyID 1420482 |
| GroupInfor-mation 1420484 | | | | | Group 1420486 | | | 0..1 1420488 | ... 1420490 |
| | | | | | | ID 1420492 | | 1 1420494 | Business-Transaction-Documen-tItemGroupID 1420496 |
| | | | | | | | | 0..1 1420500 | |

FIG. 142-17

| Package | level 1 | level 2 | level 3 | level 4 | level 5 | level 6 | level 7 | Cardinality | Datatype Name |
|---|---|---|---|---|---|---|---|---|---|
| | | | | | | Hierar-chyRela-tionship-Type-Code 1420498 | | | Business-Transaction-Documen-tItemHierar-chyRelation-shipTypeCode 1420502 |
| Business-Transac-tionDocu-mentItem-Reference 1420504 | | | | | BaseBusi nessTran saction-Documen tItem-Refer-ence 1420506 | | | 0..1 1420508 | ... 1420510 |
| | | | | | | Business-Transac-tionDocu-mentItem Refer-ence 1420512 | | 1 1420514 | Business-Transaction-Documen-tReference 1420516 |

FIG. 142-18

| Package | level 1 | level 2 | level 3 | level 4 | level 5 | level 6 | level 7 | Cardinality | Datatype Name |
|---|---|---|---|---|---|---|---|---|---|
| | | | | | Out-boundDe-liv-eryRefer-ence 1420518 | | | 0..1 1420520 | ... 1420522 |
| | | | | | | Busi-nessTran saction-Documen tItem-Refer-ence 1420524 | | 1 1420526 | Business-Transaction-Documen-tReference 1420528 |
| Sched-uleLine 1420530 | | | | | Sched-uleLine 1420532 | | | 1..n 1420534 | ... 1420536 |
| | | | | | | ID 1420538 | | 1 1420540 | Business-Transaction-Documen-tItemSched-uleLineID 1420542 |

FIG. 142-19

| Package | level 1 | level 2 | level 3 | level 4 | level 5 | level 6 | level 7 | Cardinality | Datatype Name |
|---|---|---|---|---|---|---|---|---|---|
| | | | | | | Quantity 1420544 | | 1 1420546 | Quantity 1420548 |
| | | | | | | Time-Segment 1420550 | | 1..n 1420552 | ... 1420554 |
| | | | | | | | DateTime Period 1420556 | 1 1420558 | UPPEROPEN_GLOBAL_DateTimePeriod 1420560 |
| | | | | | | | PeriodRole-Code 1420562 | 1 1420564 | PeriodRole-Code 1420566 |

FIG. 143

| Package | level 1 | level 2 | level 3 | Cardinality | Datatype Name |
|---|---|---|---|---|---|
| CustomerRequirement-ConfirmationMes-sage_sync 143000 | CustomerRe-quirement-Confirma-tionMes-sage_sync 143002 | | | | CustomerRequirementConfirma-tionMessage_sync 143004 |
| CustomerRequire-ment 143006 | | CustomerRe-quirement 143008 | | 1 143010 | ... |
| | | | ID 143012 | 1 143014 | BusinessTransactionDocumentID 143016 |
| Log 143018 | | Log 143020 | | 1 143022 | Log 143024 |

FIG. 144-1

| Package | level 1 | level 2 | level 3 | level 4 | level 5 | level 6 | level 7 | Cardinality | Datatype Name |
|---|---|---|---|---|---|---|---|---|---|
| CustomerRequire-mentCreateRe-questMessage_sync 144000 | Customer-Require-mentCre-ateRe-questMes-sage_sync 144002 | | | | | | | | Customer-Require-mentCre-ateRe-questMes-sage_sync 144004 |
| CustomerRe-quirement 144006 | | Customer Require-ment 144008 | | | | | | 1 144010 | ... |
| | | | ID 144012 | | | | | 1 144014 | Business-Transac-tionDocu-mentID 144016 |
| | | | Syste-mAdminis-trative-Data 144018 | | | | | 1 144020 | Syste-mAdminis-trativeData 144022 |

FIG. 144-2

| Package | level 1 | level 2 | level 3 | level 4 | level 5 | level 6 | level 7 | Cardinality | Datatype Name |
|---|---|---|---|---|---|---|---|---|---|
| External Request 144024 | | | External-Request 144026 | | | | | 1 144028 | ... |
| | | | | Base-Business-Transaction-Document TypeCode 144032 | | | | 1 144034 | Business-TransactionDocument-TypeCode 144036 |
| Business-TransactionDocumentReference 144038 | | | | Base-Business-Transaction-DocumentReference 144040 | | | | 0..1 144042 | ... |

FIG. 144-3

| Package | level 1 | level 2 | level 3 | level 4 | level 5 | level 6 | level 7 | Cardinality | Datatype Name |
|---|---|---|---|---|---|---|---|---|---|
| | | | | | ID 144046 | | | 1 144048 | Business-Transac-tionDocu-mentID 144050 |
| Item 144052 | | | | Item 144054 | | | | 1..n 144056 | ... |
| | | | | | ProductA-vailabili-tyRequire-mentCon-firmatio-nIte-mUUID 144060 | | | 0..1 144062 | UUID 144064 |
| | | | | | ID 144066 | | | 1 144068 | Business-Transac-tionDocu-men-tItemID 144070 |

FIG. 144-4

| Package | level 1 | level 2 | level 3 | level 4 | level 5 | level 6 | level 7 | Cardinality | Datatype Name |
|---|---|---|---|---|---|---|---|---|---|
| | | | | | Supply-Plannin-gAreaID 144072 | | | 0..1 144074 | Supply-PlanningA-reaID 144076 |
| | | | | | Base-Business-Transac-tion-Documen-tItem-TypeCode 144078 | | | 0..1 144080 | Business-Transac-tionDocu-mentItem-TypeCode 144082 |
| | | | | | Distribu-tionChan-nelCode 144084 | | | 0..1 144086 | Distribu-tionChan-nelCode 144088 |
| | | | | | Division-Code 144090 | | | 0..1 144092 | Division-Code 144094 |

FIG. 144-5

| Package | level 1 | level 2 | level 3 | level 4 | level 5 | level 6 | level 7 | Cardinality | Datatype Name |
|---|---|---|---|---|---|---|---|---|---|
| | | | | | LogisticsExecutionBlockingReasonCode 144096 | | | 0..1 144098 | BlockingReasonCode 1440100 |
| | | | | | CancellationReasonCode 1440102 | | | 0..1 1440104 | CancellationReasonCode 1440106 |
| ProductInformation 1440108 | | | | | Product 1440110 | | | 1 1440112 | ... 1440114 |
| | | | | | | InternalID 1440116 | | 1 1440118 | ProductInternalID 1440120 |
| | | | | | | SellerID 1440122 | | 0..1 1440124 | ProductPartyID 1440126 |
| | | | | | | BuyerID 1440128 | | 0..1 1440130 | ProductPartyID 1440132 |

FIG. 144-6

| Package | level 1 | level 2 | level 3 | level 4 | level 5 | level 6 | level 7 | Cardinality | Datatype Name |
|---|---|---|---|---|---|---|---|---|---|
| | | | | | | Identi-fiedStockI 1440134 | | 0..1 1440136 | Identified-StockID 1440138 |
| Party 1440140 | | | | | Buyer-Party 1440142 | | | 0..1 1440144 | ... 1440146 |
| | | | | | | ID 1440148 | | 1 1440150 | PartyID 1440152 |
| | | | | | Seller-Party 1440154 | | | 0..1 1440156 | ... 1440158 |
| | | | | | | ID 1440160 | | 1 1440162 | PartyID 1440164 |
| | | | | | Produc-tRecipi-entParty 1440166 | | | 0..1 1440168 | ... 1440170 |

FIG. 144-7

| Package | level 1 | level 2 | level 3 | level 4 | level 5 | level 6 | level 7 | Cardinality | Datatype Name |
|---|---|---|---|---|---|---|---|---|---|
| | | | | | | ID 1440172 | | 1 1440174 | PartyID 1440176 |
| Location 1440178 | | | | | Ship-ToLoca-tion 1440180 | | | 0..1 1440182 | ... 1440184 |
| | | | | | | BuyerID 1440186 | | 0..1 1440188 | Location-PartyID 1440190 |
| | | | | | | SellerID 1440192 | | 0..1 1440194 | Location-PartyID 1440196 |
| | | | | | Ship-FromLo-cation 1440198 | | | 0..1 1440200 | ... 1440202 |
| | | | | | | BuyerID 1440204 | | 0..1 1440206 | Location-PartyID 1440208 |

FIG. 144-8

| Package | level 1 | level 2 | level 3 | level 4 | level 5 | level 6 | level 7 | Cardinality | Datatype Name |
|---|---|---|---|---|---|---|---|---|---|
| | | | | | | SellerID 1440210 | | 0..1 1440212 | Location-PartyID 1440214 |
| GroupInformation 1440216 | | | | | Group 1440218 | | | 0..1 1440220 | ... 1440222 |
| | | | | | | ID 1440224 | | 1 1440226 | BusinessTransactionDocumentItemGroupID 1440228 |
| | | | | | | HierarchyRelationshipTypeCode 1440230 | | 0..1 1440232 | BusinessTransactionDocumentItemHierarchyRelationshipTypeCode 1440234 |

FIG. 144-9

| Package | level 1 | level 2 | level 3 | level 4 | level 5 | level 6 | level 7 | Cardinality | Datatype Name |
|---|---|---|---|---|---|---|---|---|---|
| Properties 1440236 | | | | | Property 1440238 | | | 0..n 1440240 | ... 1440242 |
| | | | | | | ID 1440244 | | 1 1440246 | PropertyID 1440248 |
| | | | | | | Value 1440250 | | 1 1440252 | Property-Value 1440254 |
| Delivery-Information 1440256 | | | | | Delivery-Terms 1440258 | | | 0..1 1440260 | ... 1440262 |
| | | | | | | Priority-Code 1440264 | | 0..1 1440266 | Priority-Code 1440268 |
| | | | | | | Incoterms 1440270 | | 0..1 1440272 | Incoterms 1440274 |

FIG. 144-10

| Package | level 1 | level 2 | level 3 | level 4 | level 5 | level 6 | level 7 | Cardinality | Datatype Name |
|---|---|---|---|---|---|---|---|---|---|
| | | | | | | PartialDeliveryMaximumNumberValue 1440276 | | 0..1 1440278 | NumberValue 1440280 |
| | | | | | | QuantityTolerance 1440282 | | 0..1 1440284 | QuantityTolerance 1440286 |
| | | | | | | PartialDeliveryControlCode 1440288 | | 0..1 1440290 | PartialDeliveryControlCode 1440292 |
| Transportation 1440294 | | | | | TransportationTerms 1440296 | | | 0..1 1440298 | ... 1440300 |
| | | | | | | TransportServiceLevelCode 1440302 | | 0..1 1440304 | TransportServiceLevelCode 1440306 |

FIG. 144-11

| Package | level 1 | level 2 | level 3 | level 4 | level 5 | level 6 | level 7 | Cardinality | Datatype Name |
|---|---|---|---|---|---|---|---|---|---|
| Business-Transac-tion-Documen-tItem-Reference 1440308 | | | | | Base-Business-Transac-tion-Documen-tItem-Reference 1440310 | | | 0..1 1440312 | ... 1440314 |
| | | | | | | Business-Transac-tion-Documen-tItem-Reference 1440316 | | 1 1440318 | Business-Transac-tionDocu-men-tReference 1440320 |
| Sched-uleLine 1440322 | | | | | Sched-uleLine 1440324 | | | 1..n 1440326 | ... 1440328 |

FIG. 144-12

| Package | level 1 | level 2 | level 3 | level 4 | level 5 | level 6 | level 7 | Cardinality | Datatype Name |
|---|---|---|---|---|---|---|---|---|---|
| | | | | | | ID 1440330 | | 1 1440332 | Business-Transac-tionDocu-mentItem-Sched-uleLineID 1440334 |
| | | | | | | Quantity 1440336 | | 1 1440338 | Quantity 1440340 |
| | | | | | | Time-Segment 1440342 | | 1..n 1440344 | ... 1440346 |
| | | | | | | | DateTime Period 1440348 | 1 1440350 | UPPEROPEN_GLOBAL_DateTimePeriod 1440352 |
| | | | | | | | Pe-riodRole-Code 1440354 | 1 1440356 | PeriodRole Code 1440358 |

FIG. 144-13

| Package | level 1 | level 2 | level 3 | level 4 | level 5 | level 6 | level 7 | Cardinality | Datatype Name |
|---|---|---|---|---|---|---|---|---|---|
| AvailabilityConfirmation 1440360 | | | AvailabilityConfirmation 1440362 | | | | | 0..1 1440364 | ... 1440366 |
| | | | | BaseBusinessTransactionDocument TypeCode 1440368 | | | | 1 1440370 | BusinessTransactionDocumentTypeCode 1440372 |
| BusinessTransactionDocumentReference 1440374 | | | | BaseBusinessTransactionDocumentReference 1440376 | | | | 0..1 1440378 | ... 1440380 |

FIG. 144-14

| Package | level 1 | level 2 | level 3 | level 4 | level 5 | level 6 | level 7 | Cardinality | Datatype Name |
|---|---|---|---|---|---|---|---|---|---|
| | | | | | ID 1440382 | | | 1 1440384 | BusinessTransactionDocumentID 1440386 |
| Item 1440388 | | | | Item 1440390 | | | | 1..n 1440392 | ... 1440394 |
| | | | | | ProductAvailabilityRequirementConfirmationItemUUID 1440396 | | | 0..1 1440398 | UUID 1440400 |
| | | | | | ID 1440402 | | | 1 1440404 | BusinessTransactionDocumentItemID 1440406 |

FIG. 144-15

| Package | level 1 | level 2 | level 3 | level 4 | level 5 | level 6 | level 7 | Cardinality | Datatype Name |
|---|---|---|---|---|---|---|---|---|---|
| | | | | | Base-Business-Transaction-DocumentItem-TypeCode 1440408 | | | 0..1 1440410 | Business-TransactionDocumentItem-TypeCode 1440412 |
| | | | | | SystemAdministrative-Data 1440414 | | | 1 1440416 | SystemAdministrativeData 1440418 |
| | | | | | Supply-PlanningAreaID 1440420 | | | 0..1 1440422 | Supply-PlanningAreaID 1440424 |
| | | | | | External-RequestItemUUID 1440426 | | | 1 1440428 | UUID 1440430 |

FIG. 144-16

| Package | level 1 | level 2 | level 3 | level 4 | level 5 | level 6 | level 7 | Cardinality | Datatype Name |
|---|---|---|---|---|---|---|---|---|---|
| ProductInformation 1440432 | | | | | Product 1440434 | | | 1 1440436 | ... 1440438 |
| | | | | | | InternalID 1440440 | | 1 1440442 | Product-InternalID 1440444 |
| | | | | | | SellerID 1440446 | | 0..1 1440448 | Product-PartyID 1440450 |
| | | | | | | BuyerID 1440452 | | 0..1 1440454 | Product-PartyID 1440456 |
| | | | | | | Identified-StockID 1440458 | | 0..1 1440460 | Identified-StockID 1440462 |
| Location 1440464 | | | | | Ship-FromLocation 1440466 | | | 1 1440468 | ... 1440470 |

FIG. 144-17

| Package | level 1 | level 2 | level 3 | level 4 | level 5 | level 6 | level 7 | Cardinality | Datatype Name |
|---|---|---|---|---|---|---|---|---|---|
| | | | | | | BuyerID 1440472 | | 0..1 1440474 | Location-PartyID 1440476 |
| | | | | | | SellerID 1440478 | | 0..1 1440480 | Location-PartyID 1440482 |
| GroupIn-formation 1440484 | | | | | Group 1440486 | | | 0..1 1440488 | ... 1440490 |
| | | | | | | ID 1440492 | | 1 1440494 | Business-Transac-tionDocu-mentItem-GroupID 1440496 |

FIG. 144-18

| Package | level 1 | level 2 | level 3 | level 4 | level 5 | level 6 | level 7 | Cardinality | Datatype Name |
|---|---|---|---|---|---|---|---|---|---|
| | | | | | | Hierar-chyRela-tionship-TypeCode 1440498 | | 0..1 1440500 | Business-Transac-tionDocu-mentItem-Hierar-chyRela-tionship-TypeCode 1440502 |
| Business-Transac-tion-Documen-tItem-Reference 1440504 | | | | | Base-Business-Transac-tion-Documen-tItem-Reference 1440506 | | | 0..1 1440508 | ... 1440510 |
| | | | | | | Business-Transac-tion-Documen-tItem-Reference 1440512 | | 1 1440514 | Business-Transac-tionDocu-men-tReference 1440516 |

FIG. 144-19

| Package | level 1 | level 2 | level 3 | level 4 | level 5 | level 6 | level 7 | Cardinality | Datatype Name |
|---|---|---|---|---|---|---|---|---|---|
| | | | | | Out-boundDe-liv-eryRefer-ence 1440518 | | | 0..1 1440520 | ... 1440522 |
| | | | | | | Business-Transac-tion-Documen-tItem-Reference 1440524 | | 1 1440526 | Business-Transac-tionDocu-men-tReference 1440528 |
| Sched-uleLine 1440530 | | | | | Sched-uleLine 1440532 | | | 1..n 1440534 | ... 1440536 |

FIG. 144-20

| Package | level 1 | level 2 | level 3 | level 4 | level 5 | level 6 | level 7 | Cardinality | Datatype Name |
|---|---|---|---|---|---|---|---|---|---|
| | | | | | | ID 1440538 | | 1 1440540 | Business-Transac-tionDocu-mentItem-Sched-uleLineID 1440542 |
| | | | | | | Quantity 1440544 | | 1 1440546 | Quantity 1440548 |
| | | | | | | Time-Segment 1440550 | | 1..n 1440552 | ... 1440554 |
| | | | | | | | DateTime Period 1440556 | 1 1440558 | UPPEROPEN_GLOBAL_DateTimePeriod 1440560 |

FIG. 144-21

| Package | level 1 | level 2 | level 3 | level 4 | level 5 | level 6 | level 7 | Cardinality | Datatype Name |
|---|---|---|---|---|---|---|---|---|---|
| | | | | | | | Pe-riodRole-Code 1440562 | 1 1440564 | PeriodRole Code 1440566 |

FIG. 145-1

| Package | level 1 | level 2 | level 3 | level 4 | Cardinality | Datatype Name |
|---|---|---|---|---|---|---|
| CustomerRequirementExternalRequestItemCancelRequestMessage_sync 145000 | CustomerRequirementExternalRequestItemCancelRequestMessage_sync 145002 | | | | | CustomerRequirementCreateRequestMessage_sync 145004 |
| CustomerRequirement 145006 | | CustomerRequirement 145008 | | | 1 145010 | ... |
| | | | ID 145012 | | 1 145014 | BusinessTransactionDocumentID 145016 |
| External Request 145018 | | | External-Request 145020 | | 1 145022 | ... 145024 |
| | | | | BaseBusinessTransactionDocumentTypeCode 145026 | 1 145028 | BusinessTransactionDocumentTypeCode 145030 |
| Item 145032 | | | | Item 145034 | 1 145036 | ... 145038 |

FIG. 145-2

| Package | level 1 | level 2 | level 3 | level 4 | Cardinality | Datatype Name |
|---|---|---|---|---|---|---|
| | | | | | 1 145040 | BusinessTransactionDocumentItemID 145042 |

FIG. 146-1

| Package | level 1 | level 2 | level 3 | level 4 | level 5 | level 6 | level 7 | Cardinality | Datatype Name |
|---|---|---|---|---|---|---|---|---|---|
| CustomerRequirementExternalRequestItem-ChangeRequest-Message_sync 146000 | CustomerRequirementExternalRequestItem-ChangeRequest-Message_sync 146002 | | | | | | | | CustomerRequirementCreateRequest-Message_sync 146004 |
| CustomerRequirement 146006 | | Customer Requirement 146008 | | | | | | 1 146010 | … |
| | | | ID 146012 | | | | | 1 146014 | Business-Transaction-DocumentID 146016 |

FIG. 146-2

| Package | level 1 | level 2 | level 3 | level 4 | level 5 | level 6 | level 7 | Cardinality | Datatype Name |
|---|---|---|---|---|---|---|---|---|---|
| | | | SystemAdministrativeData 146018 | | | | | 1 146020 | SystemAdministrativeData 146022 |
| External Request 146024 | | | ExternalRequest 146026 | | | | | 1 146028 | ... 146030 |
| | | | | BaseBusinessTransactionDocumentTypeCode 146032 | | | | 1 146034 | BusinessTransactionDocumentTypeCode 146036 |

FIG. 146-3

| Package | level 1 | level 2 | level 3 | level 4 | level 5 | level 6 | level 7 | Cardinality | Datatype Name |
|---|---|---|---|---|---|---|---|---|---|
| Business-TransactionDocumentReference 146038 | | | | BaseBusiness-Transaction-DocumentReference 146040 | | | | 0..1 146042 | ... 146044 |
| | | | | | ID 146046 | | | 1 146048 | Business-Transaction-DocumentID 146050 |
| Item 146052 | | | | Item 146054 | | | | 1 146056 | ... 146058 |
| | | | | | ProductAvailabilityRequirement ConfirmationItemUUID 146060 | | | 0..1 146062 | UUID 146064 |

FIG. 146-4

| Package | level 1 | level 2 | level 3 | level 4 | level 5 | level 6 | level 7 | Cardinality | Datatype Name |
|---|---|---|---|---|---|---|---|---|---|
| | | | | | ID 146066 | | | 1 146068 | Business-Transac-tion-Documen-tItemID 146070 |
| | | | | | Supply-Plannin-gAreaID 146072 | | | 0..1 146074 | Supply-Plannin-gAreaID 146076 |
| | | | | | Base-Business-Transac-tion-Documen-tItem-TypeCode 146078 | | | 0..1 146080 | Business-Transac-tion-Documen-tItem-TypeCode 146082 |
| | | | | | Distribu-tionChan-nelCode 146084 | | | 0..1 146086 | Distribu-tionChan-nelCode 146088 |

FIG. 146-5

| Package | level 1 | level 2 | level 3 | level 4 | level 5 | level 6 | level 7 | Cardinality | Datatype Name |
|---|---|---|---|---|---|---|---|---|---|
| | | | | | Division-Code 146090 | | | 0..1 146092 | Division-Code 146094 |
| | | | | | Logis-ticsExecu-tionBlock-ingRea-sonCode 146096 | | | 0..1 146098 | Blockin-gRea-sonCode 1460100 |
| | | | | | Cancella-tionRea-sonCode 1460102 | | | 0..1 1460104 | Cancella-tionRea-sonCode 1460106 |
| ProductIn-formation 1460108 | | | | | Product 1460110 | | | 1 1460112 | ... 1460114 |
| | | | | | | InternalID 1460116 | | 1 1460118 | Product-InternalID 1460120 |
| | | | | | | SellerID 1460122 | | 0..1 1460124 | Product-PartyID 1460126 |

FIG. 146-6

| Package | level 1 | level 2 | level 3 | level 4 | level 5 | level 6 | level 7 | Cardinality | Datatype Name |
|---|---|---|---|---|---|---|---|---|---|
| | | | | | | BuyerID 1460128 | | 0..1 1460130 | Product-PartyID 1460132 |
| | | | | | | Identi-fiedStockID 1460134 | | 0..1 1460136 | Identi-fiedStockID 1460138 |
| Party 1460140 | | | | | Buyer-Party 1460142 | | | 0..1 1460144 | ... 1460146 |
| | | | | | | ID 1460148 | | 1 1460150 | PartyID 1460152 |
| | | | | | Seller-Party 1460154 | | | 0..1 1460156 | ... 1460158 |
| | | | | | | ID 1460160 | | 1 1460162 | PartyID 1460164 |
| | | | | | Produc-tRecipi-entParty 1460166 | | | 0..1 1460168 | ... 1460170 |
| | | | | | | ID | | 1 | PartyID |

FIG. 146-7

| Package | level 1 | level 2 | level 3 | level 4 | level 5 | level 6 | level 7 | Cardinality | Datatype Name |
|---|---|---|---|---|---|---|---|---|---|
| | | | | | | 1460172 | | 1460174 | 1460176 |
| Location 1460178 | | | | | Ship-ToLoca-tion 1460180 | | | 0..1 1460182 | ... 1460184 |
| | | | | | | BuyerID 1460186 | | 0..1 1460188 | Location-PartyID 1460190 |
| | | | | | | SellerID 1460192 | | 0..1 1460194 | Location-PartyID 1460196 |
| | | | | | Ship-FromLo-cation 1460198 | | | 0..1 1460200 | ... 1460202 |
| | | | | | | BuyerID 1460204 | | 0..1 1460206 | Location-PartyID 1460208 |
| | | | | | | SellerID | | 0..1 | Location-PartyID |

FIG. 146-8

| Package | level 1 | level 2 | level 3 | level 4 | level 5 | level 6 | level 7 | Cardinality | Datatype Name |
|---|---|---|---|---|---|---|---|---|---|
| | | | | | | 1460210 | | 1460212 | 1460214 |
| GroupIn-formation 1460216 | | | | | Group 1460218 | | | 0..1 1460220 | ... 1460222 |
| | | | | | | ID 1460224 | | 1 1460226 | Business-Transac-tion-Documen-tItem-GroupID 1460228 |
| | | | | | | Hierar-chyRela-tionship-TypeCode 1460230 | | 0..1 1460232 | Business-Transac-tion-Documen-tItemHier-archyRe-lationship-TypeCode 1460234 |
| Properties 1460236 | | | | | Property 1460238 | | | 0..n 1460240 | ... 1460242 |
| | | | | | | ID | | 1 | Proper-tyID |

FIG. 146-9

| Package | level 1 | level 2 | level 3 | level 4 | level 5 | level 6 | level 7 | Cardinality | Datatype Name |
|---|---|---|---|---|---|---|---|---|---|
| | | | | | | 1460244 | | 1460246 | 1460248 |
| | | | | | | Value 1460250 | | 1 1460252 | Property-Value 1460254 |
| Delivery-Informa-tion 1460256 | | | | | Delivery-Terms 1460258 | | | 0..1 1460260 | ... 1460262 |
| | | | | | | Priority-Code 1460264 | | 0..1 1460266 | Priority-Code 1460268 |
| | | | | | | Incoterms 1460270 | | 0..1 1460272 | Incoterms 1460274 |
| | | | | | | PartialDe-liveryMaxi mum-Number-Value 1460276 | | 0..1 1460278 | Number-Value 1460280 |
| | | | | | | Quantity-Tolerance 1460282 | | 0..1 1460284 | Quantity-Tolerance 1460286 |

FIG. 146-10

| Package | level 1 | level 2 | level 3 | level 4 | level 5 | level 6 | level 7 | Cardinality | Datatype Name |
|---|---|---|---|---|---|---|---|---|---|
| | | | | | | PartialDeliveryControlCode 1460288 | | 0..1 1460290 | PartialDeliveryControlCode 1460292 |
| Transportation 1460294 | | | | | Transportation-Terms 1460296 | | | 0..1 1460298 | ... 1460300 |
| | | | | | | TransportServiceLevel-Code 1460302 | | 0..1 1460304 | TransportServiceLevel Code 1460306 |
| Business-Transaction-DocumentItem-Reference 1460308 | | | | | Base-Business-Transaction-DocumentItem-Reference 1460310 | | | 0..1 1460312 | ... 1460314 |

FIG. 146-11

| Package | level 1 | level 2 | level 3 | level 4 | level 5 | level 6 | level 7 | Cardinality | Datatype Name |
|---|---|---|---|---|---|---|---|---|---|
| | | | | | | Business-Transaction-DocumentItem-Reference 1460316 | | 1 1460318 | Business-Transaction-DocumentReference 1460320 |
| ScheduleLine 1460322 | | | | | ScheduleLine 1460324 | | | 1..n 1460326 | ... 1460328 |
| | | | | | | ID 1460330 | | 1 1460332 | Business-Transaction-DocumentItem-ScheduleLineID 1460334 |
| | | | | | | Quantity 1460336 | | 1 1460338 | Quantity 1460340 |
| | | | | | | Time-Segment 1460342 | | 1..n 1460344 | ... 1460346 |

FIG. 146-12

| Package | level 1 | level 2 | level 3 | level 4 | level 5 | level 6 | level 7 | Cardinality | Datatype Name |
|---|---|---|---|---|---|---|---|---|---|
| | | | | | | | DateTimePeriod 1460348 | 1 1460350 | UPPEROPEN_GLOBAL_DateTimePeriod 1460352 |
| | | | | | | | PeriodRoleCode 1460354 | 1 1460356 | PeriodRoleCode 1460358 |

FIG. 147-1

| Package | level 1 | level 2 | level 3 | level 4 | level 5 | Cardinality | Datatype Name |
|---|---|---|---|---|---|---|---|
| CustomerRequirementExternalRequestItemConfirmationMessage_sync 147000 | CustomerRequirementExternalRequestItemConfirmationMessage_sync 147002 | | | | | | CustomerRequirement-CreateRequestMessage_sync 147004 |
| CustomerRequirement 147006 | | Customer-Requirement 147008 | | | | 1 147010 | ... |
| | | | ID 147012 | | | 1 147014 | Business-Transaction-DocumentID 147016 |
| External Request 147018 | | | External-Request 147020 | | | 1 147022 | ... 147024 |

FIG. 147-2

| Package | level 1 | level 2 | level 3 | level 4 | level 5 | Cardinality | Datatype Name |
|---|---|---|---|---|---|---|---|
| | | | | BaseBusiness-TransactionDocument-TypeCode 147026 | | 1 147028 | Business-Transaction-Document-TypeCode 147030 |
| Item 147032 | | | | Item 147034 | | 1 147036 | ... 147038 |
| | | | | | ID 147040 | 1 147042 | Business-Transaction-DocumentItemID 147044 |
| Log 147046 | | Log 147048 | | | | 1 147050 | Log 147052 |

FIG. 148-1

| Package | level 1 | level 2 | level 3 | level 4 | level 5 | level 6 | level 7 | Cardinality | Datatype Name |
|---|---|---|---|---|---|---|---|---|---|
| CustomerRequirementExternalRequestItemCreateRequestMessage_sync 148000 | CustomerRequirementExternalRequestItemCreateRequestMessage_sync 148002 | | | | | | | | CustomerRequirementCreateRequestMessage_sync 148004 |
| CustomerRequirement 148006 | | CustomerRequirement 148008 | | | | | | 1 148010 | ... |

FIG. 148-2

| Package | level 1 | level 2 | level 3 | level 4 | level 5 | level 6 | level 7 | Cardinality | Datatype Name |
|---|---|---|---|---|---|---|---|---|---|
| | | | ID 148012 | | | | | 1 148014 | BusinessTransactionDocumentID 148016 |
| | | | SystemAdministrativeData 148018 | | | | | 1 148020 | SystemAdministrativeData 148022 |
| External Request 148024 | | | ExternalRequest 148026 | | | | | 1 148028 | ... 148030 |

FIG. 148-3

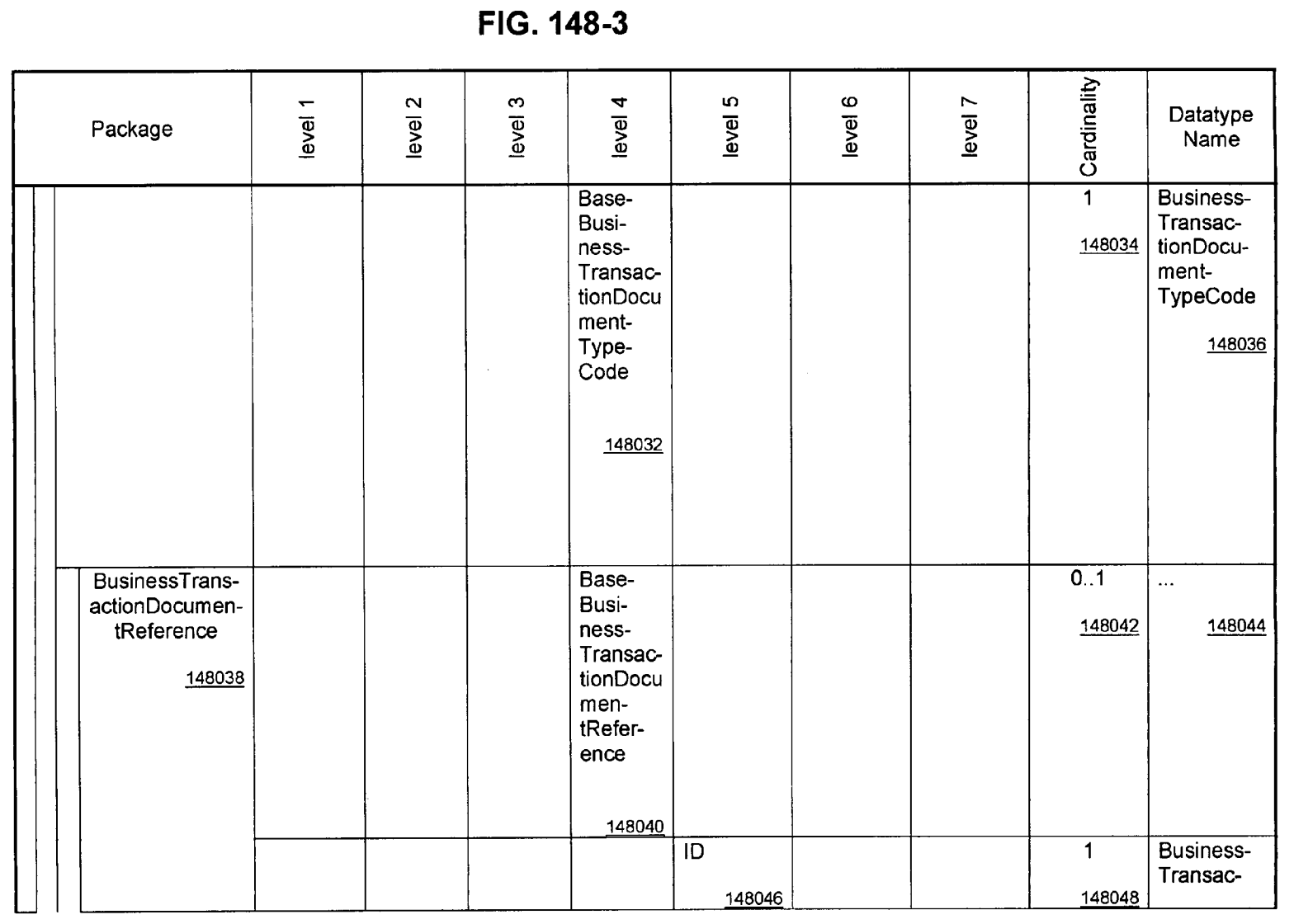

| Package | level 1 | level 2 | level 3 | level 4 | level 5 | level 6 | level 7 | Cardinality | Datatype Name |
|---|---|---|---|---|---|---|---|---|---|
| | | | | Base-Business-TransactionDocument-Type-Code 148032 | | | | 1 148034 | Business-TransactionDocument-TypeCode 148036 |
| BusinessTransactionDocumentReference 148038 | | | | Base-Business-TransactionDocumentReference 148040 | | | | 0..1 148042 | ... 148044 |
| | | | | | ID 148046 | | | 1 148048 | Business-Transac- |

FIG. 148-4

| Package | level 1 | level 2 | level 3 | level 4 | level 5 | level 6 | level 7 | Cardinality | Datatype Name |
|---|---|---|---|---|---|---|---|---|---|
| | | | | | | | | | tionDocumentID 148050 |
| Item 148052 | | | | Item 148054 | | | | 1 148056 | ... 148058 |
| | | | | | ProductAvailabilityRequirementConfirmationItemUUID 148060 | | | 0..1 148062 | UUID 148064 |
| | | | | | ID 148066 | | | 1 148068 | BusinessTransactionDocumentItemID 148070 |
| | | | | | SupplyPlanningAreaID 148072 | | | 0..1 148074 | SupplyPlanningAreaID 148076 |

FIG. 148-5

| Package | level 1 | level 2 | level 3 | level 4 | level 5 | level 6 | level 7 | Cardinality | Datatype Name |
|---|---|---|---|---|---|---|---|---|---|
| | | | | | Base-Business-Transaction-DocumentItem-TypeCode 148078 | | | 0..1 148080 | Business-Transaction-DocumentItem-TypeCode 148082 |
| | | | | | DistributionChannelCode 148084 | | | 0..1 148086 | DistributionChannelCode 148088 |
| | | | | | Division-Code 148090 | | | 0..1 148092 | Division-Code 148094 |
| | | | | | LogisticsExecutionBlockingReasonCode 148096 | | | 0..1 148098 | BlockingReason-Code 1480100 |

FIG. 148-6

| Package | level 1 | level 2 | level 3 | level 4 | level 5 | level 6 | level 7 | Cardinality | Datatype Name |
|---|---|---|---|---|---|---|---|---|---|
| | | | | | CancellationReasonCode 1480102 | | | 0..1 1480104 | CancellationReasonCode 1480106 |
| ProductInformation 1480108 | | | | | Product 1480110 | | | 1 1480112 | ... 1480114 |
| | | | | | | InternalID 1480116 | | 1 1480118 | Product-InternalID 1480120 |
| | | | | | | SellerID 1480122 | | 0..1 1480124 | Product-PartyID 1480126 |
| | | | | | | BuyerID 1480128 | | 0..1 1480130 | Product-PartyID 1480132 |
| | | | | | | Identified-StockID | | 0..1 1480136 | Identified-StockID |

FIG. 148-7

| Package | level 1 | level 2 | level 3 | level 4 | level 5 | level 6 | level 7 | Cardinality | Datatype Name |
|---|---|---|---|---|---|---|---|---|---|
| | | | | | | 1480134 | | | 1480138 |
| Party 1480140 | | | | | Buyer-Party 1480142 | | | 0..1 1480144 | ... 1480146 |
| | | | | | | ID 1480148 | | 1 1480150 | PartyID 1480152 |
| | | | | | Seller-Party 1480154 | | | 0..1 1480156 | ... 1480158 |
| | | | | | | ID 1480160 | | 1 1480162 | PartyID 1480164 |
| | | | | | Produc-tRecipi-entParty 1480166 | | | 0..1 1480168 | ... 1480170 |
| | | | | | | ID 1480172 | | 1 1480174 | PartyID 1480176 |
| Location 1480178 | | | | | Ship-ToLoca-tion | | | 0..1 1480182 | ... 1480184 |

FIG. 148-8

| Package | level 1 | level 2 | level 3 | level 4 | level 5 | level 6 | level 7 | Cardinality | Datatype Name |
|---|---|---|---|---|---|---|---|---|---|
| | | | | | 1480180 | | | | |
| | | | | | | BuyerID 1480186 | | 0..1 1480188 | Location-PartyID 1480190 |
| | | | | | | SellerID 1480192 | | 0..1 1480194 | Location-PartyID 1480196 |
| | | | | | Ship-FromLo-cation 1480198 | | | 0..1 1480200 | ... 1480202 |
| | | | | | | BuyerID 1480204 | | 0..1 1480206 | Location-PartyID 1480208 |
| | | | | | | SellerID 1480210 | | 0..1 1480212 | Location-PartyID 1480214 |
| GroupInfor-mation | | | | | Group 1480218 | | | 0..1 1480220 | ... 1480222 |

FIG. 148-9

| Package | level 1 | level 2 | level 3 | level 4 | level 5 | level 6 | level 7 | Cardinality | Datatype Name |
|---|---|---|---|---|---|---|---|---|---|
| 1480216 | | | | | | ID 1480224 | | 1 1480226 | Business-Transac-tionDocu-mentItem-GroupID 1480228 |
| | | | | | | Hierar-chyRela-tionship-TypeCode 1480230 | | 0..1 1480232 | Business-Transac-tionDocu-mentItem-Hierar-chyRela-tionship-TypeCode 1480234 |
| Properties 1480236 | | | | | Property 1480238 | | | 0..n 1480240 | ... 1480242 |
| | | | | | | ID 1480244 | | 1 1480246 | PropertyID 1480248 |
| | | | | | | Value 1480250 | | 1 1480252 | Property-Value 1480254 |

FIG. 148-10

| Package | level 1 | level 2 | level 3 | level 4 | level 5 | level 6 | level 7 | Cardinality | Datatype Name |
|---|---|---|---|---|---|---|---|---|---|
| DeliveryIn-formation 1480256 | | | | | Delivery-Terms 1480258 | | | 0..1 1480260 | ... 1480262 |
| | | | | | | Priority-Code 1480264 | | 0..1 1480266 | Priority-Code 1480268 |
| | | | | | | Incoterms 1480270 | | 0..1 1480272 | Incoterms 1480274 |
| | | | | | | PartialDe-liveryMaxi mum-Number-Value 1480276 | | 0..1 1480278 | Number-Value 1480280 |
| | | | | | | Quantity-Tolerance 1480282 | | 0..1 1480284 | Quantity-Tolerance 1480286 |
| | | | | | | PartialDe-liveryCon-trolCode 1480288 | | 0..1 1480290 | PartialDe-liveryCon-trolCode 1480292 |

FIG. 148-11

| Package | level 1 | level 2 | level 3 | level 4 | level 5 | level 6 | level 7 | Cardinality | Datatype Name |
|---|---|---|---|---|---|---|---|---|---|
| Transportation 1480294 | | | | | TransportationTerms 1480296 | | | 0..1 1480298 | ... 1480300 |
| | | | | | | TransportServiceLevelCode 1480302 | | 0..1 1480304 | TransportServiceLevelCode 1480306 |
| BusinessTransactionDocumentItemReference 1480308 | | | | | BaseBusinessTransactionDocumentItemReference 1480310 | | | 0..1 1480312 | ... 1480314 |
| | | | | | | BusinessTransactionDocumentItemReference 1480316 | | 1 1480318 | BusinessTransactionDocumentReference 1480320 |

FIG. 148-12

| Package | level 1 | level 2 | level 3 | level 4 | level 5 | level 6 | level 7 | Cardinality | Datatype Name |
|---|---|---|---|---|---|---|---|---|---|
| ScheduleLine 1480322 | | | | | Sched-uleLine 1480324 | | | 1..n 1480326 | ... 1480328 |
| | | | | | | ID 1480330 | | 1 1480332 | Business-Transac-tionDocu-mentItem-Sched-uleLineID 1480334 |
| | | | | | | Quantity 1480336 | | 1 1480338 | Quantity 1480340 |
| | | | | | | Time-Segment 1480342 | | 1..n 1480344 | ... 1480346 |
| | | | | | | | DateTime Period 1480348 | 1 1480350 | UPPEROPEN_GLOBAL_DateTimePeriod 1480352 |

FIG. 148-13

| Package | level 1 | level 2 | level 3 | level 4 | level 5 | level 6 | level 7 | Cardinality | Datatype Name |
|---|---|---|---|---|---|---|---|---|---|
| | | | | | | | PeriodRole-Code 1480354 | 1 1480356 | PeriodRole Code 1480358 |

FIG. 151-1

| Package | level 1 | level 2 | level 3 | Cardinality | Datatype Name |
|---|---|---|---|---|---|
| CustomerReturn-BasicDataByBuyer-AndBasicDataQue-ryMessage_sync 151000 | CustomerReturn-BasicDataBy-BuyerAnd-BasicDataQue-ryMessage_sync 151002 | | | | CustomerRetumBasicDataBy-BuyerAndBasicDataQueryMes-sage_sync 151004 |
| | | | ID 151006 | 1 151008 | BusinessDocumentMessageID 151010 |
| | | | Creation-DateTime 151012 | 1 151014 | DateTime 151016 |
| | | | ... 151018 | 0..1 151020 | ... 151022 |
| Selection 151024 | | CustomerRe-tum-BasicDataSe-lectionBy-BuyerAnd-BasicData 151026 | | 1 151028 | |

FIG. 151-2

| Package | level 1 | level 2 | level 3 | Cardinality | Datatype Name |
|---|---|---|---|---|---|
| | | | CustomerReturnBuyer-PartyInternalID 151030 | 1 151032 | PartyInternalID 151034 |
| | | | CustomerReturnSalesOrganisation-PartyInternalID 151036 | 0..1 151038 | PartyInternalID 151040 |
| | | | CustomerReturnSalesOfficeParty-InternalID 151042 | 0..1 151044 | PartyInternalID 151046 |
| | | | CustomerReturnSales-GroupParty-InternalID 151048 | 0..1 151050 | PartyInternalID 151052 |

FIG. 151-3

| Package | level 1 | level 2 | level 3 | Cardinality | Datatype Name |
|---|---|---|---|---|---|
| | | | CustomerReturnProcessingTypeCode 151054 | 0..1 151056 | BusinessTransactionDocumentProcessingTypeCode 151058 |
| | | | CustomerReturnSalesTermsDistributionChannelCode 151060 | 0..1 151062 | DistributionChannelCode 151064 |
| | | | CustomerReturnSalesTermsDivisionCode 151066 | 0..1 151068 | DivisionCode 151070 |

FIG. 152-1

| Package | level 1 | level 2 | level 3 | level 4 | Cardinality | Datatype Name |
|---|---|---|---|---|---|---|
| CustomerReturn-BasicDataByBuyer-AndBasicDataRe-sponseMes-sage_sync 152000 | CustomerRe-turnBasicDa-taByBuyerAnd-BasicDataRe-sponseMes-sage_sync 152002 | | | | | CustomerReturn-BasicDataByBuyer-AndBasicDataRespon-seMessage_sync 152004 |
| | | | ID 152006 | | 1 152008 | BusinessDocument-MessageID 152010 |
| | | | Creation-DateTime 152012 | | 1 152014 | DateTime 152016 |
| | | | ... | | 0..1 152018 | |
| CustomerReturn 152020 | | Customer-Return 152022 | | | 0..N 152024 | |
| | | | ID 152026 | | 1 152028 | CustomerReturnID 152030 |

FIG. 152-2

| Package | level 1 | level 2 | level 3 | level 4 | Cardinality | Datatype Name |
|---|---|---|---|---|---|---|
| | | | Processing-TypeCode 152032 | | 0..1 152034 | BusinessTransaction-DocumentProcessing-TypeCode 152036 |
| | | | Processing-TypeName 152038 | | 0..1 152040 | LEN20_Name, Quali-fier: ProcessingType 152042 |
| | | | BuyerID 152044 | | 0..1 152046 | BusinessTransaction-DocumentID 152048 |
| Party 152050 | | | BuyerParty 152052 | | 1 152054 | |
| | | | | InternalID 152056 | 1 152058 | PartyInternalID 152060 |
| | | | | Formatted-Name 152062 | 0..1 152064 | LONG_Name, Qualifier: PartyFormatted 152066 |

FIG. 152-3

| Package | level 1 | level 2 | level 3 | level 4 | Cardinality | Datatype Name |
|---|---|---|---|---|---|---|
| | | | SalesOrgani-sationParty 152068 | | 1 152070 | |
| | | | | InternalID 152072 | 1 152074 | PartyInternalID 152076 |
| | | | | Formatted-Name 152078 | 0..1 152080 | LONG_Name, Qualifier: PartyFormatted 152082 |
| | | | SalesOffice-Party 152084 | | 0..1 152086 | |
| | | | | InternalID 152088 | 1 152090 | PartyInternalID 152092 |
| | | | | Formatted-Name 152094 | 0..1 152096 | LONG_Name, Qualifier: PartyFormatted 152098 |
| | | | SalesGroup-Party 152000A | | 0..1 152002A | |

FIG. 152-4

| Package | level 1 | level 2 | level 3 | level 4 | Cardinality | Datatype Name |
|---|---|---|---|---|---|---|
| | | | | InternalID 152004A | 1 152006A | PartyInternalID 152008A |
| | | | | Formatted-Name 152010A | 0..1 152012A | LONG_Name, Qualifier: PartyFormatted 152014A |
| SalesTerms 152016A | | | SalesTerms 152018A | | 0..1 152020A | |
| | | | | Distribution-Channel-Code 152022A | 0..1 152024A | DistributionChannel-Code 152026A |
| | | | | Distribution-Channel-Name 152028A | 0..1 152030A | LEN20_Name, Quali-fier: DistributionChannel 152032A |
| | | | | Division-Code 152034A | 0..1 152036A | DivisionCode 152038A |

FIG. 152-5

| Package | level 1 | level 2 | level 3 | level 4 | Cardinality | Datatype Name |
|---|---|---|---|---|---|---|
| | | | | Division-Name 152040A | 0..1 152042A | LEN20_Name, Qualifier: Division 152044A |
| DateTerms | | | DateTerms 152048A | | 0..1 152050A | |
| 152046A | | | | RequestDate 152052A | 0..1 152054A | Date 152056A |
| TotalValues | | | TotalValues 152060A | | 0..1 152062A | |
| 152058A | | | | NetAmount 152064A | 0..1 152066A | Amount 152068A |
| Log 152070A | | Log 152072A | | | 1 152074A | Log 152076A |

FIG. 153

| Package | level 1 | level 2 | level 3 | Cardinality | Datatype Name |
|---|---|---|---|---|---|
| CustomerReturnCreate-ConfiramtionMes-sage_sync 153000 | CustomerReturnCreate-ConfiramtionMes-sage_sync 153002 | | | | CustomerReturnCreateCon-firamtionMessage_sync 153004 |
| CustomerReturn 153006 | | CustomerReturn 153008 | | 0..1 153010 | |
| | | | ID 153012 | 1 153014 | CustomerReturnID 153016 |
| Log 153018 | | Log 153020 | | 1 153022 | Log 153024 |

FIG. 154-1

| Package | level 1 | level 2 | level 3 | level 4 | level 5 | Cardinality | Datatype Name |
|---|---|---|---|---|---|---|---|
| CustomerReturnCreateRequestMessage_sync 154000 | CustomerReturnCreateRequestMessage_sync 154002 | | | | | | CustomerReturnCreateRequestMessage_sync 154004 |
| CustomerReturn 154006 | | CustomerReturn 154008 | | | | 1 154010 | |
| | | | ProcessingTypeCode 154012 | | | 1 154014 | BusinessTransactionDocumentProcessingTypeCode 154016 |
| | | | BuyerID 154018 | | | 0..1 154020 | BusinessTransactionDocumentID 154022 |
| Party 154024 | | | BuyerParty 154026 | | | 1 154028 | |
| | | | | InternalID 154030 | | 1 154032 | PartyInternalID 154034 |

FIG. 154-2

| Package | level 1 | level 2 | level 3 | level 4 | level 5 | Cardinality | Datatype Name |
|---|---|---|---|---|---|---|---|
| | | | SalesOr-ganisa-tionParty 154036 | | | 1 154038 | |
| | | | | InternalID 154040 | | 1 154042 | PartyInternalID 154044 |
| SalesTerms 154046 | | | Sales-Terms 154048 | | | 1 154050 | |
| | | | | Distribu-tionChan-nelCode 154052 | | 1 154054 | DistributionChannelCode 154056 |
| | | | | Division-Code 154058 | | 1 154060 | DivisionCode 154062 |
| | | | | Reason-Code 154064 | | 1 154066 | CustomerTransactionDocu-mentReasonCode 154068 |

FIG. 154-3

| Package | level 1 | level 2 | level 3 | level 4 | level 5 | Cardinality | Datatype Name |
|---|---|---|---|---|---|---|---|
| Item 154070 | | | Item 154072 | | | 0..N 154074 | |
| ProductIn-foramtion 154076 | | | | Product 154078 | | 1 154080 | |
| | | | | | SellerID 154082 | 1 154084 | ProductPartyID 154086 |
| TotalVal-ues 154088 | | | | TotalVal-ues 154090 | | 1 154092 | |
| | | | | | Request-edQuan-tity 154094 | 1 154096 | Quantity 154098 |

FIG. 155-1

| Package | level 1 | level 2 | level 3 | level 4 | level 5 | Cardinality | Datatype Name |
|---|---|---|---|---|---|---|---|
| CustomerReturnMessage 155000 | Customer-Return-Message 155002 | | | | | | CustomerReturnMessage 155004 |
| | | | ID 155006 | | | 1 155008 | BusinessDocument-MessageID 155010 |
| | | | Creation-DateTime 155012 | | | 1 155014 | DateTime 155016 |
| | | | ... | | | 0..1 155018 | ... 155020 |
| CustomerReturn 155022 | | Customer-Return 155024 | | | | 0..1 155026 | |
| | | | ID 155028 | | | 1 155030 | CustomerReturnID 155032 |

FIG. 155-2

| Package | level 1 | level 2 | level 3 | level 4 | level 5 | Cardinality | Datatype Name |
|---|---|---|---|---|---|---|---|
| | | | Process-ingType-Code 155034 | | | 1 155036 | BusinessTransaction-DocumentProcessing-TypeCode 155038 |
| | | | Processing-TypeName 155040 | | | 0..1 155042 | LEN20_Name, Quali-fier: ProcessingType 155044 |
| | | | BuyerID 155046 | | | 0..1 155048 | BusinessTransaction-DocumentID 155050 |
| | | | BuyerPost-ingDate 155052 | | | 0..1 155054 | Date 155056 |
| Party 155058 | | | BuyerParty 155060 | | | 1 155062 | |
| | | | | SellerID 155064 | | 1 155066 | PartyPartyID 155068 |

FIG. 155-3

| Package | level 1 | level 2 | level 3 | level 4 | level 5 | Cardinality | Datatype Name |
|---|---|---|---|---|---|---|---|
| | | | | Formatted-Name 155068 | | 0..1 155070 | LONG_Name, Quali-fier: PartyFormatted 155072 |
| | | | SalesOr-ganisation-Party 155074 | | | 1 155076 | |
| | | | | SellerIID 155078 | | 1 155080 | PartyPartyID 155082 |
| | | | | Formatted-Name 155084 | | 0..1 155086 | LONG_Name, Quali-fier: PartyFormatted 155088 |
| | | | Sale-sOfficeParty 155090 | | | 0..1 155092 | |
| | | | | SellerIID 155094 | | 1 155096 | PartyInternalID 155098 |

FIG. 155-4

| Package | level 1 | level 2 | level 3 | level 4 | level 5 | Cardinality | Datatype Name |
|---|---|---|---|---|---|---|---|
| | | | | Formatted-Name 155000A | | 0..1 155002A | LONG_Name, Qualifier: PartyFormatted 155004A |
| | | | Sales-GroupParty 155006A | | | 0..1 155008A | |
| | | | | SellerID 155010A | | 1 155012A | PartyInternalID 155014A |
| | | | | Formatted-Name 155016A | | 0..1 155018A | LONG_Name, Qualifier: PartyFormatted 155020A |
| SalesTerms 155022A | | | SalesTerms 155024A | | | 1 155026A | |
| | | | | Distribu-tionChan-nelCode 155028A | | 1 155030A | DistributionChannel-Code 155032A |

FIG. 155-5

| Package | level 1 | level 2 | level 3 | level 4 | level 5 | Cardinality | Datatype Name |
|---|---|---|---|---|---|---|---|
| | | | | DistributionChannelName 155034A | | 0..1 155036A | LEN20_Name, Qualifier: DistributionChannel 155038A |
| | | | | Division-Code 155040A | | 0..1 155042A | DivisionCode 155044A |
| | | | | Division-Name 155046A | | 0..1 155048A | LEN20_Name, Qualifier: Division 155050A |
| | | | | Reason-Code 155052A | | 1 155054A | CustomerTransactionDocumentReasonCode 155056A |
| Item 155058A | | | Item 155060A | | | 0..N 155062A | |
| | | | | ID 155064A | | 1 155066A | CustomerReturnItemID 155068A |

FIG. 155-6

| Package | level 1 | level 2 | level 3 | level 4 | level 5 | Cardinality | Datatype Name |
|---|---|---|---|---|---|---|---|
| ProductIn-foramtion 155070A | | | | Product 155072A | | 1 155074A | |
| | | | | | SellertID 155076A | 1 155078A | ProductPartyID 155080A |
| TotalValues 155082A | | | | TotalValues 155084A | | 1 155086A | |
| | | | | | Request-edQuantity 155088A | 1 155090A | Quantity 155092A |
| Log 155094A | | Log 155096A | | | | 0..1 155098A | Log 155000B |

FIG. 167

| Package | level 1 | level 2 | level 3 | Cardinality | Datatype Name |
|---|---|---|---|---|---|
| EquipmentResource-ByIDQueryMessage_sync 16700 | EquipmentResourceByIDQuery-Message_sync 16702 | | | 1 16704 | EquipmentResourceByIDQuery-Message_sync 16706 |
| Selection 16708 | | EquipmentResourceSelection-ByID 16710 | | 1 16712 | |
| | | | ID 16714 | 1 16716 | ResourceID 16718 |

FIG. 168-1

| Package | level 1 | level 2 | level 3 | level 4 | level 5 | Cardinality | Datatype Name |
|---|---|---|---|---|---|---|---|
| EquipmentResourceBy-IDResponseMes-sage_sync 168000 | EquipmentRe-sourceBy-IDResponse-Mes-sage_sync 168002 | | | | | 1 168004 | EquipmentRe-sourceByIDRe-sponseMes-sage_sync> 168006 |
| MessageHeader 168008 | | Message-Header 168010 | | | | 1 168012 | BusinessDocu-mentMessage-Header 168014 |
| | | | ID 168016 | | | 1 168018 | BusinessDocu-mentMessageID 168020 |
| EquipmentRe-source 168022 | | Equipmen-tResource 168024 | | | | 1 168026 | ... |
| | | | ID 168028 | | | 1 168030 | ResourceID 168032 |
| | | | FactoryCal-endarCode 168034 | | | 1 168036 | WorkingDayCal-endarCode 168038 |
| | | | Capacity-Code | | | 1 | ResourceCapac-ityCdoe |

FIG. 168-2

| Package | level 1 | level 2 | level 3 | level 4 | level 5 | Cardinality | Datatype Name |
|---|---|---|---|---|---|---|---|
| | | | 168040 | | | 168042 | 168044 |
| | | | Capacity-MultipleIn-dicator 168046 | | | 1 168048 | MultipleIndicator 168050 |
| | | | InPastDura-tion 168052 | | | 1 168054 | DAY_Duration 168056 |
| | | | InFutureDu-ration 168058 | | | 1 168060 | DAY_Duration 168062 |
| | | | Description 168064 | | | 0..1 168066 | |
| | | | | Description 168068 | | 0..1 168070 | MEDIUM_Descri ption 168072 |
| | | | Downtime 168074 | | | | |
| | | | | Downti-meRea-sonCode 168076 | | 0..1 168078 | ResourceDown-timeReason-Code 168080 |

FIG. 168-3

| Package | level 1 | level 2 | level 3 | level 4 | level 5 | Cardinality | Datatype Name |
|---|---|---|---|---|---|---|---|
| | | | | Resource-Down-timePeriod 168082 | | 0..1 168084 | DateTimePeriod 168086 |
| | | | | Down-timeDe-scription 168088 | | 0..1 168090 | MEDIUM_Description 168092 |
| | | | Capacit-yAnd-Schedul-ingInforma-tion 168094 | | | ... | ... |
| | | | | Capac-ityNumber-Value 168096 | | 1 168098 | NumberValue 1680100 |
| | | | | CapacityUti-lizationPer-cent 1680102 | | 1 1680104 | Percent 1680106 |
| | | | | BucketCa-pacitySour-ceCode | | | |

FIG. 168-4

| Package | level 1 | level 2 | level 3 | level 4 | level 5 | Cardinality | Datatype Name |
|---|---|---|---|---|---|---|---|
| | | | | 1680108 | | | |
| | | | | Capacity-Measure-TypeCode 1680110 | | 1 1680112 | MeasureType-Code 1680114 |
| | | | | Capacity-Measure-UnitCode 1680116 | | 1 1680118 | MeasureUnit-Code 1680120 |
| | | | | BucketCa-pacityNum-berValue 1680122 | | 1 1680124 | NumberValue 1680126 |
| | | | | BucketCa-pacity-Measure-TypeCode 1680128 | | 1 1680130 | MeasureType-Code 1680132 |
| | | | | BucketCa-pacity-Measure- | | 1 1680136 | MeasureUnit-Code |

FIG. 168-5

| Package | level 1 | level 2 | level 3 | level 4 | level 5 | Cardinality | Datatype Name |
|---|---|---|---|---|---|---|---|
| | | | | UnitCode 1680134 | | | 1680138 |
| | | | | NumberOf-Periods 1680140 | | 1 1680142 | NumberValue 1680144 |
| | | | | Operating-Hours 1680146 | | 0..1 1680148 | ... |
| | | | | | StartTime-Point 1680150 | 1 1680152 | StartTimePoint 1680154 |
| | | | | | EndTime-Point 1680156 | 1 1680158 | EndTimePoint 1680160 |
| | | | | | BreakDura-tion 1680162 | 1 1680164 | TIME_Duration 1680166 |
| | | | Capacity-Calen-darItem 1680168 | | | ... | |

FIG. 168-6

| Package | level 1 | level 2 | level 3 | level 4 | level 5 | Cardinality | Datatype Name |
|---|---|---|---|---|---|---|---|
| | | | | Date 1680170 | | 1 1680172 | Timepoint 1680174 |
| | | | | StartTime-Point 1680176 | | 1 1680178 | StartTimePoint 1680180 |
| | | | | EndTime-Point 1680182 | | 1 1680184 | EndTimePoint 1680186 |
| | | | | BreakDura-tion 1680188 | | 1 1680190 | TIME_Duration 1680192 |
| | | | | Produc-tiveDuration 1680194 | | | Duration 1680196 |
| | | | | Capac-ityNumber-Value 1680198 | | | Value 1680200 |
| | | | | Capacity-Measure-UnitCode 1680202 | | | MeasureUnit-Code 1680204 |

FIG. 168-7

| Package | level 1 | level 2 | level 3 | level 4 | level 5 | Cardinality | Datatype Name |
|---|---|---|---|---|---|---|---|
| | | | | BucketCapacityNumberValue 1680206 | | | Value 1680208 |
| | | | | Bucket-MeasureUnitCode 1680210 | | | MeasureUnit-Code 1680212 |
| | | | Location 1680214 | | | ... | ... |
| | | | | LocationID 1680216 | | ... | LocationID 1680218 |
| Log 1680220 | | Log 1680222 | | | | | Log 1680224 |

FIG. 169

| Package | level 1 | level 2 | level 3 | Cardinality | Datatype Name |
|---|---|---|---|---|---|
| EquipmentResourceChangeConfirmationMessage_sync 169000 | EquipmentResourceChangeConfirmationMessage_sync 169002 | | | | <MessageDataType> 169004 |
| MessageHeader 169006 | | MessageHeader 169008 | | 1 169010 | BusinessDocumentMessageHeader 169012 |
| | | | ID 169014 | 1 169016 | BusinessDocumentMessageID 169018 |
| | | | CreationDateTime 169020 | 1 169022 | DateTime 169024 |
| EquipmentResource 169026 | | EquipmentResource 169028 | | 1 169030 | ... |
| | | | ID 169032 | 0..1 169034 | ResourceID 169036 |
| Log 169038 | | Log 169040 | | 1 169042 | Log 169044 |

FIG. 170-1

| Package | level 1 | level 2 | level 3 | level 4 | level 5 | Cardinality | Datatype Name |
|---|---|---|---|---|---|---|---|
| EquipmentResourceChangeRequestMessage_sync 17000 | EquipmentResourceCreateRequestMessage_sync 17002 | | | | | | <MessageDataType> 17004 |
| MessageHeader 17006 | | MessageHeader 17008 | | | | 1 17010 | BusinessDocumentMessageHeader 17012 |
| | | | ID 17014 | | | 1 17016 | BusinessDocumentMessageID 17018 |
| EquipmentResource 17020 | | EquipmentResource 17022 | | | | 1 17024 | ... |
| | | | ID 17026 | | | 1 17028 | ResourceID 17030 |
| | | | InPastDuration 17032 | | | 0..1 17034 | DAY_Duration 17036 |

FIG. 170-2

| Package | level 1 | level 2 | level 3 | level 4 | level 5 | Cardinality | Datatype Name |
|---|---|---|---|---|---|---|---|
| | | | InFutureDuration 17038 | | | 0..1 17040 | DAY_Duration 17042 |
| | | | Description 17044 | | | ... | ... |
| | | | | EquipmentResourceDescription 17046 | | 0..1 17048 | MEDIUM_Description 17050 |
| | | | Downtime 17052 | | | ... | ... |
| | | | | DowntimeReasonCode 17054 | | 0..1 17056 | ResourceDowntimeReasonCode 17058 |
| | | | | ResourceDowntimePeriod 17060 | | 0..1 17062 | DateTimePeriod 17064 |

FIG. 170-3

| Package | level 1 | level 2 | level 3 | level 4 | level 5 | Cardinality | Datatype Name |
|---|---|---|---|---|---|---|---|
| | | | | Down-timeDe-scription 17066 | | 0..1 17068 | MEDIUM_Description 17070 |
| | | | Capacit-yAndSched-ulingInforma-tion 17072 | | | ... | ... |
| | | | | Capac-ityNumber-Value 17074 | | 0..1 17076 | NumberValue 17078 |
| | | | | Capac-ityUtiliza-tionPercent 17080 | | 0..1 17082 | Percent 17084 |
| | | | | BucketCa-pacitySour-ceCode 17086 | | | |

FIG. 170-4

| Package | level 1 | level 2 | level 3 | level 4 | level 5 | Cardinality | Datatype Name |
|---|---|---|---|---|---|---|---|
| | | | | Capacity-Measure-TypeCode 17088 | | 0..1 17090 | MeasureType-Code 17092 |
| | | | | Capacity-Measure-UnitCode 17094 | | 0..1 17096 | MeasureUnit-Code 17098 |
| | | | | BucketCa-pacityNum-berValue 170100 | | 0..1 170102 | NumberValue 170104 |
| | | | | BucketCa-pacity-Measure-TypeCode 170106 | | 0..1 170108 | MeasureType-Code 170110 |
| | | | | BucketCa-pacity-Measure-UnitCode 170112 | | 0..1 170114 | MeasureUnit-Code 170116 |

FIG. 170-5

| Package | | level 1 | level 2 | level 3 | level 4 | level 5 | Cardinality | Datatype Name |
|---|---|---|---|---|---|---|---|---|
| | | | | | NumberOf-Periods 170118 | | 0..1 170120 | NumberValue 170122 |
| | | | | | Operating-Hours 170124 | | ... | ... |
| | | | | | | StartTimePoint 170126 | 0..1 170128 | TimePoint 170130 |
| | | | | | | EndTimePoint 170132 | 0..1 170134 | TimePoint 170136 |
| | | | | | | BreakDuration 170138 | 0..1 170140 | TIME_Duration 170142 |

FIG. 171

| Package | level 1 | level 2 | level 3 | Cardinality | Datatype Name |
|---|---|---|---|---|---|
| EquipmentResourceCreateConfirmationMessage_sync 17100 | EquipmentResource-CreateConfirmation-Message_sync 17102 | | | | <Message-DataType> 17104 |
| MessageHeader 17106 | | MessageHeader 17108 | | 1 17110 | BusinessDocu-mentMessage-Header 17112 |
| | | | ID 17114 | 1 17116 | BusinessDocu-mentMessageID 17118 |
| | | | Creation-DateTime 17120 | 1 17122 | DateTime 17124 |
| EquipmentResource 17126 | | EquipmentRe-source 17128 | | 1 17130 | ... |
| | | | ID 17132 | 0..1 17134 | ResourceID 17136 |
| Log 17138 | | Log 17140 | | 1 17142 | LOG 17144 |

FIG. 172-1

| Package | level 1 | level 2 | level 3 | level 4 | level 5 | Cardinality | Datatype Name |
|---|---|---|---|---|---|---|---|
| EquipmentResourceCreateRequestMessage_sync 17200 | EquipmentResourceCreateRequestMessage_sync 17202 | | | | | | EquipmentResourceCreateRequestMessage_sync 17204 |
| MessageHeader 17206 | | MessageHeader 17208 | | | | 1 17210 | BusinessDocumentMessageHeader 17212 |
| | | | ID 17214 | | | 1 17216 | BusinessDocumentMessageID 17218 |
| EquipmentResource 17220 | | EquipmentResource 17222 | | | | 1 17224 | ... |
| | | | ID 17226 | | | ... | ResourceID 17228 |
| | | | FactoryCalendarCode 17230 | | | | WorkingDayCalendarCode 17232 |

FIG. 172-2

| Package | level 1 | level 2 | level 3 | level 4 | level 5 | Cardinality | Datatype Name |
|---|---|---|---|---|---|---|---|
| | | | Capacity-Code 17234 | | | | ResourceCapac-ityCdoe 17236 |
| | | | CapacityMul-tipleIndicator 17238 | | | | MultipleIndicator 17240 |
| | | | InPastDura-tion 17242 | | | | DAY_Duration 17244 |
| | | | InFutureDura-tion 17246 | | | | DAY_Duration 17248 |
| Descritption 17250 | | | Description 17252 | | | ... | ... |
| | | | | Description 17254 | | ... | MEDIUM_Descripti on 17256 |
| Capacity 17258 | | | Downtime 17260 | | | ... | |

FIG. 172-3

| Package | level 1 | level 2 | level 3 | level 4 | level 5 | Cardinality | Datatype Name |
|---|---|---|---|---|---|---|---|
| | | | | DowntimeReasonCode 17262 | | ... | ResourceDowntimeReasonCode 17264 |
| | | | | ResourceDowntimePeriod 17266 | | | DateTimePeriod 17268 |
| | | | | Description 17270 | | | MEDIUM_Description 17272 |
| | | | CapacityAndSchedulingInformation 17274 | | | ... | ... |
| | | | | CapacityNumberValue 17276 | | | NumberValue 17278 |
| | | | | CapacityUtilizationPercent 17280 | | | Percent 17282 |

FIG. 172-4

| Package | level 1 | level 2 | level 3 | level 4 | level 5 | Cardinality | Datatype Name |
|---|---|---|---|---|---|---|---|
| | | | | BucketCapaci-tySourceCode 17284 | | | |
| | | | | Capacity-Measure-TypeCode 17286 | | | MeasureTypeCode 17288 |
| | | | | Capacity-MeasureUnit-Code 17290 | | | MeasureUnitCode 17292 |
| | | | | BucketCapac-ityNumber-Value 17294 | | | NumberValue 17296 |
| | | | | BucketCapac-ityMeasure-TypeCode 17298 | | | MeasureTypeCode 172100 |
| | | | | BucketCapac-ityMeasure-UnitCode 172102 | | | MeasureUnitCode 172104 |

FIG. 172-5

| Package | level 1 | level 2 | level 3 | level 4 | level 5 | Cardinality | Datatype Name |
|---|---|---|---|---|---|---|---|
| | | | | NumberOfPe-riods 172106 | | | NumberValue 172108 |
| | | | | Operating-Hours 172110 | | ... | ... |
| | | | | | StartTime-Point 172112 | ... | TimePoint 172114 |
| | | | | | EndTime-Point 172116 | ... | TimePoint 172118 |
| | | | | | BreakDu-ration 172120 | | Time_Duration 172122 |
| Reference 172124 | | | Location 172126 | | | ... | ... |
| | | | | LocationID 172128 | | ... | LocationID 172130 |

FIG. 173-1

| Package | level 1 | level 2 | level 3 | Cardinality | Datatype Name |
|---|---|---|---|---|---|
| EquipmentResourceDeactivateConfirmationMessage_sync 173000 | EquipmentResourceDeactivateConfirmationMessage_sync 173002 | | | | <MessageDataType> 173004 |
| MessageHeader 173006 | | MessageHeader 173008 | | 1 173010 | BusinessDocumentMessageHeader 173012 |
| | | | ID 173014 | 1 173016 | BusinessDocumentMessageID 173018 |
| | | | CreationDateTime 173020 | 1 173022 | DateTime 173024 |
| | | | ... | 0..1 173026 | ... |
| EquipmentResource 173028 | | EquipmentResource 173030 | | 1 173032 | ... |
| | | | ID 173034 | 0..1 173036 | ResourceID 173038 |
| | | | | | |

FIG. 173-2

| Package | | level 1 | level 2 | level 3 | Cardinality | Datatype Name |
|---|---|---|---|---|---|---|
| | Log 173040 | | Log 173042 | | 1 173044 | Log 173046 |

FIG. 174

| Package | level 1 | level 2 | level 3 | Cardinality | Datatype Name |
|---|---|---|---|---|---|
| EquipmentResourceDeactivateRequestMessage_sync 17400 | EquipmentResourceDeativateRequestMessage_sync 17402 | | | | <MessageDataType> 17404 |
| MessageHeader 17406 | | MessageHeader 17408 | | 1 17410 | BusinessDocumentMessageHeader 17412 |
| | | | ID 17414 | 1 17416 | BusinessDocumentMessageID 17418 |
| | | | CreationDateTime 17420 | 1 17422 | DateTime 17424 |
| EquipmentResource 17426 | | EquipmentResource 17428 | | 1 17430 | ... |
| | | | ID 17432 | 1 17434 | ResourceID 17436 |

FIG. 175

| Package | level 1 | level 2 | level 3 | Cardinality | Datatype Name |
|---|---|---|---|---|---|
| EquipmentResourceSimpleByLocationResponseMessage_sync 175000 | EquipmentResourceSimpleByLocationResponseMessage_sync 175002 | | | 1 175004 | EquipmentResourceSimpleByLocationResponse_sync 175006 |
| EquipmentResource 175008 | | EquipmentResource 175010 | | 1 175012 | |
| | | | ID 175014 | 0..N 175016 | ResourceID 175018 |
| Log 175020 | | Log 175022 | | 1 175024 | Log 175026 |

FIG. 176

| Package | level 1 | level 2 | level 3 | Cardinality | Datatype Name |
|---|---|---|---|---|---|
| EquipmentResourceSimpleByLocationQueryMessage_sync 176000 | EquipmentResourceSimpleByLocationQueryMessage_sync 176002 | | | | <MessageDataType> 176004 |
| Selection 176006 | | EquipmentResourceSelectionSimpleByLocation 176008 | | 1 176010 | ... |
| | | | LocationID 176012 | 1 176014 | LocationID 176016 |

FIG. 180-1

| Package | level 1 | level 2 | level 3 | Cardinality | Datatype Name |
|---|---|---|---|---|---|
| FundsManagementAccountByID-QueryMessage_sync 180000 | FundsManage-mentAccountBy-IDQueryMes-sage_sync 180002 | | | | FundsManagementAc-countByIDQueryMes-sage_sync 180004 |
| Selection 180006 | | FundsMan-agementAc-countSelec-tionByID 180008 | | 1 180010 | FundsManagementAc-countSelectionByID 180012 |
| | | | FundsMan-agemen-tAreaID 180014 | 1 180016 | FundsManagementAreaID 180018 |
| | | | Fis-calYearID 180020 | 1 180022 | FiscalYearID 180024 |

FIG. 180-2

| Package | | | | level 1 | level 2 | level 3 | Cardinality | Datatype Name |
|---|---|---|---|---|---|---|---|---|
| | | | | | | FundsManagementAccountID 180026 | 1 180028 | FundsManagementAccountID 180030 |

FIG. 181-1

| Package | level 1 | level 2 | level 3 | Cardinality | Datatype Name |
|---|---|---|---|---|---|
| FundsManagementAccountByIDResponseMessage_sync 181000 | <MessageDataType> 181002 | | | | <MessageDataType> 181004 |
| FundsManagementAccount 181006 | | FundsManagementAccount 181008 | | 0..1 181010 | |
| | | | FundsManagementAreaID 181012 | 1 181014 | FundsManagementAreaID 181016 |
| | | | FiscalYearID 181018 | 1 181020 | FiscalYearID 181022 |
| | | | ID 181024 | 1 181026 | FundsManagementAccountID 181028 |
| | | | SuperiorFundsManagementAccountID 181030 | 0..1 181032 | FundsManagementAccountID 181034 |

FIG. 181-2

| Package | level 1 | level 2 | level 3 | Cardinality | Datatype Name |
|---|---|---|---|---|---|
| FundsManagementAccount 181006 | | | CategoryCode 181036 | 1 181038 | FundsManagementAccountCategoryCode 181040 |
| | | | CategoryName 181042 | 1 181044 | LONG_Name 181046 |
| | | | BalanceCarryForwardDestinationCode 181048 | 0..1 181050 | FundsManagementAccountCarryForwardDestinationCode 181052 |
| | | | AuthorisationGroupCode 181054 | 0..1 181056 | AuthorisationGroupCode 181058 |
| | | | ValidityPeriod 181060 | 0..1 181062 | CLOSED_DatePeriod 181064 |
| | | | PostingAllowedIndicator 181066 | 1 181068 | AllowedIndicator 181070 |
| | | | StatisticalPurposeUseIndicator 181072 | 1 181074 | UsedIndicator 181076 |

FIG. 181-3

| Package | | level 1 | level 2 | level 3 | Cardinality | Datatype Name |
|---|---|---|---|---|---|---|
| | FundsManage-mentAccount 181006 | | | FutureCashEffective-nessFiscalYearBudgetin-gAllowedIndicator 181078 | 1 181080 | AllowedIndicator 181082 |
| | | | | Name 181084 | 0..1 181086 | LEN20_Name 181088 |
| | | | | Description 181090 | 0..1 181092 | LEN150_Description 181094 |
| Log 181096 | | | Log 181098 | | 1 1810100 | Log 1810102 |

FIG. 182-1

| Package | level 1 | level 2 | level 3 | Cardinality | Datatype Name |
|---|---|---|---|---|---|
| FundsManagementAccountChangeConfirmationMessage_sync 182000 | <MessageDataType> 182002 | | | | <MessageDataType> 182004 |
| MessageHeader 182006 | | MessageHeader 182008 | | 0..1 182010 | BasicBusinessDocumentMessageHeader 182012 |
| FundsManagementAccount 182014 | | FundsManagementAccount 182016 | | 0..1 182018 | |
| | | | FundsManagementAreaID 182020 | 1 182022 | FundsManagementAreaID 182024 |
| | | | FiscalYearID 182026 | 1 182028 | FiscalYearID 182030 |

FIG. 182-2

| Package | | | level 1 | level 2 | level 3 | Cardinality | Datatype Name |
|---|---|---|---|---|---|---|---|
| | | | | | ID 182032 | 1 182034 | FundsManage-mentAccountID 182036 |
| | Log 182038 | | | Log 182040 | | 1 182042 | Log 182044 |

FIG. 183-1

| Package | level 1 | level 2 | level 3 | Cardinality | Datatype Name |
|---|---|---|---|---|---|
| FundsManagementAccountChangeRequestMessage_sync 183000 | <MessageDataType> 183002 | | | | <MessageDataType> 183004 |
| MessageHeader 183006 | | MessageHeader 183008 | | 0..1 183010 | BasicBusinessDocumentMessageHeader 183012 |
| FundsManagementAccount 183014 | | FundsManagementAccount 183016 | | 1 183018 | |
| | | | FundsManagementAreaID 183020 | 1 183022 | FundsManagementAreaID 183024 |
| | | | FiscalYearID 183026 | 1 183028 | FiscalYearID 183030 |
| | | | ID 183032 | 1 183034 | FundsManagementAccountID 183036 |

FIG. 183-2

| Package | level 1 | level 2 | level 3 | Cardinality | Datatype Name |
|---|---|---|---|---|---|
| | | | SuperiorFundsManagementAccountID 183038 | 0..1 183040 | FundsManagementAccountID 183042 |
| | | | CategoryCode 183044 | 0..1 183046 | FundsManagementAccountCategoryCode 183048 |
| | | | BalanceCarryForwardDestinationCode 183050 | 0..1 183052 | FundsManagementAccountCarryForwardDestinationCode 183054 |
| | | | AuthorisationGroupCode 183056 | 0..1 183058 | AuthorisationGroupCode 183060 |
| | | | ValidityPeriod 183062 | 0..1 183064 | CLOSED_DatePeriod 183066 |
| | | | StatisticalPurposeUseIndicator 183068 | 0..1 183070 | UsedIndicator 183072 |

FIG. 183-3

| Package | level 1 | level 2 | level 3 | Cardinality | Datatype Name |
|---|---|---|---|---|---|
| | | | FutureCashEffective-nessFiscalYearBudgetin-gAllowedIndicator 183074 | 0..1 183076 | AllowedIndicator 183078 |
| | | | Name 183080 | 0..1 183082 | LEN20_Name 183084 |
| | | | Description 183086 | 0..1 183088 | LEN150_Description 183090 |

FIG. 184-1

| Package | level 1 | level 2 | level 3 | Cardinality | Datatype Name |
|---|---|---|---|---|---|
| FundsManagementAccountCreateConfirmationMessage_sync 184000 | <MessageDataType> 184002 | | | | <MessageDataType> 184004 |
| MessageHeader 184006 | | MessageHeader 184008 | | 0..1 184010 | BasicBusinessDocumentMessageHeader 184012 |
| FundsManagementAccount 184014 | | FundsManagementAccount 184016 | | 0..1 184018 | |
| | | | FundsManagementAreaID 184020 | 1 184022 | FundsManagementAreaID 184024 |
| | | | FiscalYearID 184026 | 1 184028 | FiscalYearID 184030 |

FIG. 184-2

| Package | level 1 | level 2 | level 3 | Cardinality | Datatype Name |
|---|---|---|---|---|---|
| | | | ID 184032 | 1 184034 | FundsManagementAc-countID 184036 |
| Log 184038 | | Log 184040 | | 1 184042 | Log 184044 |

FIG. 185-1

| Package | level 1 | level 2 | level 3 | Cardinality | Datatype Name |
|---|---|---|---|---|---|
| FundsManagementAccountCreateRequest-Message_sync 185000 | <MessageDataType> 185002 | | | | <MessageDataType> 185006 |
| MessageHeader 185008 | | Message-Header 185010 | | 0..1 185012 | BasicBusinessDocument-MessageHeader 185016 |
| FundsMan-agementAc-count 185018 | | FundsMan-agementAc-count 185020 | | 1 185022 | |
| | | | FundsMan-agemen-tAreaID 185026 | 1 185028 | FundsManagementAreaID 185032 |
| | | | Fis-calYearID 185034 | 1 185036 | FiscalYearID 185040 |
| | | | ID 185042 | 1 185044 | FundsManagementAccoun-tID 185048 |

FIG. 185-2

| Package | | | level 1 | level 2 | level 3 | Cardinality | Datatype Name |
|---|---|---|---|---|---|---|---|
| | | | | | Superior-FundsMan-agemen-tAccountID 185050 | 0..1 185052 | FundsManagementAccoun-tID 185056 |
| | | | | | Category-Code 185058 | 1 185060 | FundsManagementAccount-CategoryCode 185064 |
| | | | | | Balance-CarryFor-wardDesti-nationCode 185066 | 0..1 185068 | FundsManagementAcount-CarryForwardDestination-Code 185072 |
| | | | | | Authorisa-tionGroup-Code 185074 | 0..1 185076 | AuthorisationGroupCode 185080 |
| | | | | | ValidityPe-riod 185082 | 0..1 185084 | CLOSED_DatePeriod 185088 |

FIG. 185-3

| Package | level 1 | level 2 | level 3 | Cardinality | Datatype Name |
|---|---|---|---|---|---|
| | | | PostingAllowedIndicator 185090 | 1 185092 | AllowedIndicator 185096 |
| | | | StatisticalPurposeUseIndicator 185098 | 1 1850100 | UsedIndicator 1850104 |
| | | | FutureCashEffectivenessFiscalYearBudgetingAllowedIndicator 1850106 | 1 1850108 | AllowedIndicator 1850112 |
| | | | Name 1850114 | 1 1850116 | LEN20_Name 1850120 |
| | | | Description 1850122 | 0..1 1850124 | LEN150_Description 1850128 |

FIG. 186-1

| Package | level1 | level2 | level3 | Cardinality | Datatype Name |
|---|---|---|---|---|---|
| FundsManagementAccountMessage_sync 186000 | <MessageDataType> 186002 | | | | <MessageDataType> 186004 |
| MessageHeader 186006 | | MessageHeader 186008 | | 0..1 186010 | BasicBusinessDocumentMessageHeader 186012 |
| FundsManagementAccount 186014 | | FundsManagementAccount 186016 | | 1 186018 | |
| | | | FundsManagementAreaID 186020 | 1 186022 | FundsManagementAreaID 186024 |
| | | | FiscalYearID 186026 | 1 186028 | FiscalYearID 186030 |
| | | | ID 186032 | 0..1 186034 | FundsManagementAccountID 186036 |
| | | | SuperiorFundsManagementAccountID 186038 | 0..1 186040 | FundsManagementAccountID 186042 |

FIG. 186-2

| Package | level1 | level2 | level3 | Cardinality | Datatype Name |
|---|---|---|---|---|---|
| | | | CategoryCode 186044 | 0..1 186046 | FundsManagementAccount-CategoryCode 186048 |
| | | | CategoryName 186050 | 0..1 186052 | LONG_Name 186054 |
| | | | CarryForwardDestinationCode 186056 | 0..1 186058 | FundsManagementAcountCarry-ForwardDestinationCode 186060 |
| | | | AuthorisationGroupCode 186062 | 0..1 186064 | AuthorisationGroupCode 186066 |
| | | | ValidityPeriod 186068 | 0..1 186070 | CLOSED_DatePeriod 186072 |
| | | | PostingAllowedIndicator 186074 | 0..1 186076 | AllowedIndicator 186078 |
| | | | StatisticalPurposeUseIndicator 186080 | 0..1 186082 | UsedIndicator 186084 |

FIG. 186-3

| Package | level1 | level2 | level3 | Cardinality | Datatype Name |
|---|---|---|---|---|---|
| | | | FutureCashEffectivenessFiscalYearBudgetingAllowedIndicator 186086 | 0..1 186088 | AllowedIndicator 186090 |
| | | | Name 186092 | 0..1 186094 | LEN20_Name 186096 |
| | | | Description 186098 | 0..1 1860100 | LEN150_Description 1860102 |
| Log 1860104 | | Log 1860106 | | 0..1 1860108 | Log 1860110 |

FIG. 187-1

| Package | level 1 | level 2 | level 3 | level 4 | Cardinality | Datatype Name |
|---|---|---|---|---|---|---|
| FundsManagementAccountSimpleByElementsQueryMessage_sync 187000 | FundsManagementAccountSimpleByElementsQueryMessage_sync 187002 | | | | | FundsManagementAccountByIDQueryMessage_sync 187004 |
| Selection 187006 | | FundsManagementAccountSimpleSelectionByElements 187008 | | | 1 187010 | FundsManagementAccountSelectionByID 187012 |
| | | | FundsManagementAreaID 187014 | | 1 187016 | FundsManagementAreaID 187018 |
| | | | FiscalYearID 187020 | | 0..1 187022 | FiscalYearID 187024 |

FIG. 187-2

| Package | | | | level 1 | level 2 | level 3 | level 4 | Cardinality | Datatype Name |
|---|---|---|---|---|---|---|---|---|---|
| | | | | | | Funds-Manage-mentAc-countID 187026 | | 0..1 187028 | FundsManage-mentAccountID 187030 |
| | | | | | | Superior-Funds-Manage-mentAc-countID 187032 | | 0..1 187034 | FundsManage-mentAcountID 187036 |
| | | | | | | Funds-Manage-mentAc-count-Category-Code 187038 | | 0..1 187040 | FundsManage-mentAccount-CategoryCode 187042 |

FIG. 187-3

| Package | | | | level 1 | level 2 | level 3 | level 4 | Cardinality | Datatype Name |
|---|---|---|---|---|---|---|---|---|---|
| | | | | | | Funds-Manage-mentAc-countBal-anceCar-ryFor-wardDesti-nation-Code 187044 | | 0..1 187046 | FundsManage-mentAcountCar-ryForwardDesti-nationCode 187048 |
| | | | | | | Authorisa-tion-GroupCod e 187050 | | 0..1 187052 | Authorisation-GroupCode 187054 |
| | | | | | | ValidityPe-riod 187056 | | 0..1 187058 | CLOSED_DateP eriod 187060 |
| | | | | | | PostingAl-lowedIndi-cator 187062 | | 0..1 187064 | AllowedIndicator 187066 |

FIG. 187-4

| Package | | | | level 1 | level 2 | level 3 | level 4 | Cardinality | Datatype Name |
|---|---|---|---|---|---|---|---|---|---|
| | | | | | | StatisticalPurposeUseIndicator 187068 | | 0..1 187070 | UsedIndicator 187072 |
| | | | | | | FutureCashEffectivenessFiscalYearBudgetingAllowedIndicator 187074 | | 0..1 187076 | AllowedIndicator 187078 |
| | | | | | | StatisticalPurposeUseIndicator 187080 | | 0..1 187082 | UsedIndicator 187084 |

FIG. 187-5

| Package | | | | level 1 | level 2 | level 3 | level 4 | Cardinality | Datatype Name |
|---|---|---|---|---|---|---|---|---|---|
| | | | | | | Funds-Manage-mentAc-count-Name 187086 | | 0..1 187088 | LEN20_Name 187090 |
| | | | | | | Funds-Manage-mentAc-countDe-scription 187092 | | 0..1 187094 | LEN150_Description 187096 |
| | | | | | | Selection-ByFis-calYearID 187098 | | 0..1 1870100 | |
| | | | | | | | Inclusion-Exclu-sionCode 1870102 | 0..1 1870104 | InclusionExclu-sionCode 1870106 |

FIG. 187-6

| Package | | | | level 1 | level 2 | level 3 | level 4 | Cardinality | Datatype Name |
|---|---|---|---|---|---|---|---|---|---|
| | | | | | | | Interval-Bound-aryType-Code 1870108 | 1 1870110 | IntervalBound-aryTypeCode 1870112 |
| | | | | | | | Lower-Bound-aryFis-calYearID 1870114 | 0..1 1870116 | FiscalYearID 1870118 |
| | | | | | | | Upper-Bound-aryFis-calYearID 1870120 | 0..1 1870122 | FiscalYearID 1870124 |
| | | | | | | Selection-ByFunds-Manage-mentAc-countID 1870126 | | 0..1 1870128 | |

FIG. 187-7

| Package | | | | level 1 | level 2 | level 3 | level 4 | Cardinality | Datatype Name |
|---|---|---|---|---|---|---|---|---|---|
| | | | | | | | Inclusion-Exclu-sionCode 1870130 | 0..1 1870132 | InclusionExclu-sionCode 1870134 |
| | | | | | | | Interval-Bound-aryType-Code 1870136 | 1 1870138 | IntervalBound-aryTypeCode 1870140 |
| | | | | | | | Lower-Bound-aryFunds-Manage-mentAc-countID 1870142 | 0..1 1870144 | FundsManage-mentAccountID 1870146 |
| | | | | | | | Upper-Bound-aryFunds-Manage-mentAc-countID 1870148 | 0..1 1870150 | FundsManage-mentAccountID 1870152 |

FIG. 187-8

| Package | | | | level 1 | level 2 | level 3 | level 4 | Cardinality | Datatype Name |
|---|---|---|---|---|---|---|---|---|---|
| | | | | | | Selection-ByFunds-Management-Account-Category-Code 1870154 | | 0..1 1870156 | |
| | | | | | | | Inclusion-Exclu-sionCode 1870158 | 0..1 1870160 | InclusionExclu-sionCode 1870162 |
| | | | | | | | Interval-Bound-aryType-Code 1870164 | 1 1870166 | IntervalBound-aryTypeCode 1870168 |

FIG. 187-9

| Package | | | | level 1 | level 2 | level 3 | level 4 | Cardinality | Datatype Name |
|---|---|---|---|---|---|---|---|---|---|
| | | | | | | | LowerBoundaryFundsManagementAccountCategoryCode 1870170 | 0..1 1870172 | FundsManagementAccountCategoryCode 1870174 |
| | | | | | | | UpperBoundaryFundsManagementAccountCategoryCode 1870176 | 0..1 1870178 | FundsManagementAccountCategoryCode 1870180 |

FIG. 187-10

| Package | | | | level 1 | level 2 | level 3 | level 4 | Cardinality | Datatype Name |
|---|---|---|---|---|---|---|---|---|---|
| | | | | | | SelectionByFunds-Management-AccountBal-anceCar-ryFor-wardDesti-nation-Code 1870182 | | 0..1 1870184 | |
| | | | | | | | Inclusion-Exclu-sionCode 1870186 | 0..1 1870188 | InclusionExclu-sionCode 1870190 |
| | | | | | | | Interval-Bound-aryType-Code 1870192 | 1 1870194 | IntervalBound-aryTypeCode 1870196 |

FIG. 187-11

| Package | | | | level 1 | level 2 | level 3 | level 4 | Cardinality | Datatype Name |
|---|---|---|---|---|---|---|---|---|---|
| | | | | | | | LowerBoundary-Funds-Management-AccountBalanceCarryForwardDestination-Code 1870198 | 0..1 1870200 | FundsManagement-Account-CarryForward-DestinationCode 1870202 |
| | | | | | | | UpperBoundary-Funds-Management-AccountBalanceCarryForwardDestination-Code 1870204 | 0..1 1870206 | FundsManagement-Account-CarryForward-DestinationCode 1870208 |

FIG. 187-12

| Package | | | | level 1 | level 2 | level 3 | level 4 | Cardinality | Datatype Name |
|---|---|---|---|---|---|---|---|---|---|
| | | | | | | Selection-ByAuthori-sation-Group-Code 1870210 | | 0..1 1870212 | |
| | | | | | | | Inclusion-Exclu-sionCode 1870214 | 0..1 1870216 | InclusionExclu-sionCode 1870218 |
| | | | | | | | Interval-Bound-aryType-Code 1870220 | 1 1870222 | IntervalBound-aryTypeCode 1870224 |
| | | | | | | | Lower-Bound-aryAu-thorisation Group-Code 1870226 | 0..1 1870228 | Authorisation-GroupCode 1870230 |

FIG. 187-13

| Package | | | | level 1 | level 2 | level 3 | level 4 | Cardinality | Datatype Name |
|---|---|---|---|---|---|---|---|---|---|
| | | | | | | | Upper-Bound-aryAu-thorisation Group-Code 1870232 | 0..1 1870234 | Authorisation-GroupCode 1870236 |
| | | | | | | | | | |
| | | | | | | Selection-ByValid-ityStart-Date 1870238 | | 0..1 1870240 | |
| | | | | | | | Inclusion-Exclu-sionCode 1870242 | 0..1 1870244 | InclusionExclu-sionCode 1870246 |

FIG. 187-14

| Package | | | | level 1 | level 2 | level 3 | level 4 | Cardinality | Datatype Name |
|---|---|---|---|---|---|---|---|---|---|
| | | | | | | | Interval-Bound-aryType-Code 1870248 | 1 1870250 | IntervalBound-aryTypeCode 1870252 |
| | | | | | | | Lower-Bound-aryValid-ityStart-Date 1870254 | 0..1 1870256 | Date 1870258 |
| | | | | | | | Upper-Bound-aryValid-ityStart-Date 1870260 | 0..1 1870262 | Date 1870264 |
| | | | | | | Selection-ByValid-ityEndDate 1870266 | | 0..1 1870268 | |

FIG. 187-15

| Package | | | | level 1 | level 2 | level 3 | level 4 | Cardinality | Datatype Name |
|---|---|---|---|---|---|---|---|---|---|
| | | | | | | | Inclusion-Exclu-sionCode 1870270 | 0..1 1870272 | InclusionExclu-sionCode 1870274 |
| | | | | | | | Interval-Bound-aryType-Code 1870276 | 1 1870278 | IntervalBound-aryTypeCode 1870280 |
| | | | | | | | Lower-Bound-aryValid-ityEnd-Date 1870282 | 0..1 1870284 | Date 1870286 |
| | | | | | | | Upper-Bound-aryValid-ityEnd-Date 1870288 | 0..1 1870290 | Date 1870292 |

FIG. 187-16

| Package | | | | level 1 | level 2 | level 3 | level 4 | Cardinality | Datatype Name |
|---|---|---|---|---|---|---|---|---|---|
| | | | | | | Selection-ByFunds-Manage-mentAc-count-Name 1870294 | | 0..1 1870296 | |
| | | | | | | | Inclusion-Exclu-sionCode 1870298 | 0..1 1870300 | InclusionExclu-sionCode 1870302 |
| | | | | | | | Interval-Bound-aryType-Code 1870304 | 1 1870306 | IntervalBound-aryTypeCode 1870308 |

FIG. 187-17

| Package | | | | level 1 | level 2 | level 3 | level 4 | Cardinality | Datatype Name |
|---|---|---|---|---|---|---|---|---|---|
| | | | | | | | Lower-Boundary-FundsManagementAccount-Name 1870310 | 0..1 1870312 | LEN20_Name 1870314 |
| | | | | | | | Upper-Boundary-FundsManagementAccount-Name 1870316 | 0..1 1870318 | LEN20_Name 1870320 |
| | | | | | | Selection-ByFunds-ManagementAccountDe-scription 1870322 | | 0..1 1870324 | |

FIG. 187-18

| Package | | | | level 1 | level 2 | level 3 | level 4 | Cardinality | Datatype Name |
|---|---|---|---|---|---|---|---|---|---|
| | | | | | | | Inclusion-Exclu-sionCode 1870326 | 0..1 1870328 | InclusionExclu-sionCode 1870330 |
| | | | | | | | Interval-Bound-aryType-Code 1870332 | 1 1870334 | IntervalBound-aryTypeCode 1870336 |
| | | | | | | | Lower-Boundary-FundsMa nage-mentAc-countDe-scription 1870338 | 0..1 1870340 | LEN150_Descrip tion 1870342 |

FIG. 187-19

| Package | | | | level 1 | level 2 | level 3 | level 4 | Cardinality | Datatype Name |
|---|---|---|---|---|---|---|---|---|---|
| | | | | | | | Upper-Boundary-FundsManage-mentAc-countDe-scription 1870344 | 0..1 1870346 | LEN150_Description 1870348 |

FIG. 188-1

| Package | | level 1 | level 2 | level 3 | Cardinality | Datatype Name |
|---|---|---|---|---|---|---|
| FundsManagementAccountSimpleByElementsResponseMessage_sync 188000 | | <MessageDataType> 188002 | | | | <MessageDataType> 188004 |
| | FundsManagementAccount 188006 | | FundsManagementAccount 188008 | | 0..1 188010 | |
| | | | | FundsManagementAreaID 188012 | 1 188014 | FundsManagementAreaID 188016 |
| | | | | FiscalYearID 188018 | 1 188020 | FiscalYearID 188022 |
| | | | | ID 188024 | 1 188026 | FundsManagementAccountID 188028 |
| | | | | Name 188030 | 0..1 188032 | LEN20_Name 188034 |

FIG. 188-2

| Package | | level 1 | level 2 | level 3 | Cardinality | Datatype Name |
|---|---|---|---|---|---|---|
| | | | | Description 188036 | 0..1 188038 | LEN150_Description 188040 |
| Log 188042 | | | Log 188044 | | 1 188046 | Log 188048 |

FIG. 196

| Package | level 1 | level 2 | level 3 | Cardinality | Datatype Name |
|---|---|---|---|---|---|
| GoodsMovementCancel ConfirmationMessage_sync 196000 | GoodsMovementCancel Confirmation_sync 196002 | | | | GoodsMovementCancel ConfirmationMessage_sync 196004 |
| MessageHeader 196006 | | MessageHeader 196008 | | 0..1 196010 | BasicBusinessDocument MessageHeader 196012 |
| GoodsMovement 196014 | | GoodsMovement 196016 | | 0..1 196018 | |
| | | | ID 196020 | 1 196022 | GoodsMovementID 196024 |
| | | | Year 196026 | 1 196028 | Year 196030 |
| Log 196032 | | Log 196034 | | 1 196036 | Log 196038 |

FIG. 197

| Package | level 1 | level 2 | level 3 | level 4 | Cardinality | Datatype Name |
|---|---|---|---|---|---|---|
| GoodsMovementCancelRequestMessage_sync 197000 | GoodsMovementCancelRequest_sync 197002 | | | | | GoodsMovementCancelRequestMessage_sync 197004 |
| MessageHeader 197006 | | MessageHeader 197008 | | | 0..1 197010 | BasicBusinessDocumentMessageHeader 197012 |
| GoodsMovement 197014 | | GoodsMovement 197016 | | | 1 197018 | |
| | | | ID 197020 | | 1 197022 | GoodsMovementID 197024 |
| | | | Year 197026 | | 1 197028 | Year 197030 |
| | | | Posting Date 197032 | | 0..1 197034 | Date 197036 |
| | | | Item 197038 | | 0..n 197040 | |
| | | | | ID 197042 | 1 197044 | GoodsMovementItemID 197046 |

FIG. 198

| Package | level 1 | level 2 | level 3 | Cardinality | Datatype Name |
|---|---|---|---|---|---|
| GoodsMovementCreateConfirmationMessage_sync 198000 | GoodsMovementCreateConfirmation_sync 198002 | | | | GoodsMovementForDeliveryCreateConfirmationMessage 198004 |
| MessageHeader 198006 | | MessageHeader 198008 | | 0..1 198010 | BasicBusinessDocumentMessageHeader 198012 |
| GoodsMovement 198014 | | GoodsMovement 198016 | | 0..1 198018 | |
| | | | ID 198020 | 1 198022 | GoodsMovementID 198024 |
| | | | Year 198026 | 1 198028 | Year 198030 |
| Log 198032 | | Log 198034 | | 1 198036 | Log 198038 |

FIG. 199-1

| Package | level 1 | level 2 | level 3 | level 4 | level 5 | Cardinality | Datatype Name |
|---|---|---|---|---|---|---|---|
| GoodsMovementCreateRequestMessage_sync 199000 | GoodsMovementCreateRequestMessage_sync 199002 | | | | | | GoodsMovementCreateRequestMessage_sync 199004 |
| MessageHeader 199006 | | MessageHeader 199008 | | | | 0..1 199010 | BasicBusinessDocumentMessageHeader 199012 |
| GoodsMovement 199014 | | GoodsMovement 199016 | | | | 1 199018 | |
| | | | PostingDate 199020 | | | 1 199022 | Date 199024 |

FIG. 199-2

| Package | level 1 | level 2 | level 3 | level 4 | level 5 | Cardinality | Datatype Name |
|---|---|---|---|---|---|---|---|
| | | | Document Creation Date 199026 | | | 0..1 199028 | Date 199030 |
| | | | Description 199032 | | | 0..1 199034 | SHORT_ Description 199036 |
| | | | Goods Movement Category Code 199038 | | | 1 199040 | Goods Movement Category Code 199042 |
| | | | External Goods Movement Reference Document ID 199044 | | | 0..1 199046 | Goods Movement Reference DocumentID 199048 |

FIG. 199-3

| Package | level 1 | level 2 | level 3 | level 4 | level 5 | Cardinality | Datatype Name |
|---|---|---|---|---|---|---|---|
| | | | Goods Receipt IssueSlip PrintType Code 199050 | | | 0..1 199052 | Goods Receipt IssueSlip PrintType Code 199054 |
| Item 199056 | | | Item 199058 | | | 1..n 199060 | |
| | | | | Goods Movement TypeCode 199062 | | 1 199064 | Goods Movement TypeCode 199066 |
| | | | | Inventory Usability Code 199068 | | 0..1 199070 | Inventory Usability Code 199072 |
| | | | | Inventory SpecialStock TypeCode 199074 | | 0..1 199076 | Inventory Special StockType Code 199078 |

FIG. 199-4

| Package | level 1 | level 2 | level 3 | level 4 | level 5 | Cardinality | Datatype Name |
|---|---|---|---|---|---|---|---|
| | | | | Goods Movement ReasonCode 199080 | | 0..1 199082 | Goods Movement ReasonCode 199084 |
| | | | | Unloading PointName 199086 | | 0..1 199088 | Unloading PointName 199090 |
| | | | | Goods Recipient Name 199092 | | 0..1 199094 | Goods Recipient Name 199096 |
| | | | | PlantID 199098 | | 1 1990100 | PlantID 1990102 |
| | | | | Description 1990104 | | 0..1 1990106 | MEDIUM_ Description 1990108 |
| | | | | Sales OrderID 1990110 | | 0..1 1990112 | Sales OrderID 1990114 |

FIG. 199-5

| Package | level 1 | level 2 | level 3 | level 4 | level 5 | Cardinality | Datatype Name |
|---|---|---|---|---|---|---|---|
| | | | | SalesOrder ItemID 1990116 | | 0..1 1990118 | SalesOrder ItemID 1990120 |
| | | | | ProjectWork Breakdown Structure ElementID 1990122 | | 0..1 1990124 | ProjectWork Breakdown Structure ElementID 1990126 |
| Party 1990128 | | | | Product Recipient Party 1990130 | | 0..1 1990132 | |
| | | | | | InternalID 1990134 | 1 1990136 | Party InternalID 1990138 |
| | | | | SellerParty 1990140 | | 0..1 1990142 | |
| | | | | | InternalID 1990144 | 1 1990146 | Party InternalID 1990148 |

FIG. 199-6

| Package | level 1 | level 2 | level 3 | level 4 | level 5 | Cardinality | Datatype Name |
|---|---|---|---|---|---|---|---|
| Location 1990150 | | | | Inventory Managed Location 1990152 | | 0..1 1990154 | |
| | | | | | InternalID 1990156 | 1 1990158 | Location InternalID 1990160 |
| Product 1990162 | | | | Material 1990164 | | 1 1990166 | |
| | | | | | InternalID 1990168 | 1 1990170 | Product InteralID 1990172 |
| | | | | | StandardID 1990174 | 0..1 1990176 | Product StandardID 1990178 |
| | | | | | BatchID 1990180 | 0..1 1990182 | BatchID 1990184 |
| | | | | | Vendor BatchID 1990186 | 0..1 1990188 | BatchID 1990190 |

FIG. 199-7

| Package | level 1 | level 2 | level 3 | level 4 | level 5 | Cardinality | Datatype Name |
|---|---|---|---|---|---|---|---|
| | | | | | Expiration Date 1990192 | 0..1 1990194 | Date 1990196 |
| | | | | | Production Date 1990198 | 0..1 1990200 | Date 1990202 |
| | | | | | SerialID Create Automatic Indicator 1990204 | 0..1 1990206 | Indicator 1990208 |
| | | | | Serial Number 1990210 | | 0..n 1990212 | |
| | | | | | SerialID 1990214 | 1 1990216 | SerialID 1990218 |
| Quantity 1990220 | | | | Quantity 1990222 | | 1 1990224 | |

FIG. 199-8

| Package | level 1 | level 2 | level 3 | level 4 | level 5 | Cardinality | Datatype Name |
|---|---|---|---|---|---|---|---|
| | | | | | Entry Quantity 1990226 | 1 1990228 | Quantitiy 1990230 |
| Account Assignment 1990232 | | | | Account Assignment 1990234 | | 0..1 1990236 | |
| | | | | | Cost CentreID 1990238 | 0..1 1990240 | Cost CentreID 1990242 |
| | | | | | General Ledger AccountID 1990244 | 0..1 1990246 | General Ledger AccountID 1990248 |
| | | | | | Prodcution OrderID 1990250 | 0..1 1990252 | Prodcution OrderID 1990254 |
| | | | | | Maintenance OrderID 1990256 | 0..1 1990258 | Maintenance OrderID 1990260 |

FIG. 199-9

| Package | level 1 | level 2 | level 3 | level 4 | level 5 | Cardinality | Datatype Name |
|---|---|---|---|---|---|---|---|
| | | | | | Sales OrderID 1990262 | 0..1 1990264 | Sales OrderID 1990266 |
| | | | | | SalesOrder ItemID 1990268 | 0..1 1990270 | SalesOrder ItemID 1990272 |
| | | | | | SalesOrder Item Schedule LineID 1990274 | 0..1 1990276 | Business Transaction Document Item Schedule LineID 1990278 |
| | | | | | Profit CentreID 1990280 | 0..1 1990282 | Profit CentreID 1990284 |
| | | | | | ProjectWork Breakdown Structure ElementID 1990286 | 0..1 1990288 | ProjectWork Breakdown Structure ElementID 1990290 |

FIG. 199-10

| Package | level 1 | level 2 | level 3 | level 4 | level 5 | Cardinality | Datatype Name |
|---|---|---|---|---|---|---|---|
| | | | | | MasterFixed AssetID 1990292 | 0..1 1990294 | MasterFixed AsseilD 1990296 |
| | | | | | Fixed AssetID 1990298 | 0..1 1990300 | FixedAs-setID 1990302 |
| | | | | | Funds Management FundID 1990304 | 0..1 1990306 | Funds Management FundID 1990308 |
| | | | | | Fundes Management CentreID 1990310 | 0..1 1990312 | Fundes Management CentreID 1990314 |
| | | | | | Funds Management AccountID 1990316 | 0..1 1990318 | Funds Management AccountID 1990320 |
| | | | | | Costing ActivityID 1990322 | 0..1 1990324 | Costing ActivityID 1990326 |

FIG. 199-11

| Package | level 1 | level 2 | level 3 | level 4 | level 5 | Cardinality | Datatype Name |
|---|---|---|---|---|---|---|---|
| | | | | | Resource ClassID 1990328 | 0..1 1990330 | Resource ClassID 1990332 |
| | | | | | GrantID 1990334 | 0..1 1990336 | GrantID 1990338 |
| | | | | | Trading Partner Accounting Business AreaCode 1990340 | 0..1 1990342 | Accounting Business AreaCode 1990344 |
| | | | | | Clearing CompanyID 1990346 | 0..1 1990348 | CompanyID 1990350 |
| | | | | | Project NetworkID 1990352 | 0..1 1990354 | Project NetworkID 1990356 |
| | | | | | Project ActivityID 1990358 | 0..1 1990360 | Project ActivityID 1990362 |

FIG. 200

| Package | level 1 | level 2 | level 3 | Cardinality | Datatype Name |
|---|---|---|---|---|---|
| GoodsMovementWithReferenceCreateConfirmation 200000 | GoodsMovementWithReferenceCreateConfirmation 200002 | | | | GoodsMovementWithReferenceCreateConfirmationMessage 200004 |
| GoodsMovement 200006 | | GoodsMovement 200008 | | 0..1 200010 | |
| | | | GoodsMovementID 200012 | 1 200014 | GoodsMovementID 200016 |
| Log 200018 | | Log 200020 | | 1 200022 | Log 200024 |

FIG. 201

| Package | level 1 | level 2 | level 3 | Cardinality | Datatype Name |
|---|---|---|---|---|---|
| GoodsMovementWithReferenceCreateRequestMessage 201000 | GoodsMovementWithReferenceCreateRequestMessage 201002 | | | | GoodsMovementWithReferenceCreateRequestMessage 201004 |
| GoodsMovement 201006 | | GoodsMovement 201008 | | 1 201010 | |
| | | | BaseBusinessTransactionDocumentID 201012 | 1 201014 | BusinessTranscationDocumentID 201016 |
| | | | BaseBusinessTransactionDocumentTypeCode 201018 | 1 201020 | BusinessTranscationDocumentTypeCode 201022 |

FIG. 215-1

| Package | level 1 | level 2 | level 3 | Cardinality | Datatype Name |
|---|---|---|---|---|---|
| InternalControlSignoffAttachmentbyID-Query 215000 | InternalControl-SignoffAttach-mentbyIDQuery 215002 | | | | InternalControlSignoffAttach-mentbyIDQuery 215004 |
| MessageHeader 215006 | | MessageHeader 215008 | | 1 215010 | BusinessDocumentMessage-Header 215012 |
| | | | ID 215014 | 1 215016 | BusinessDocumentMessageID 215018 |
| | | | CreationDateTime 215020 | 1 215022 | DateTime 215024 |
| Selection 215026 | | InternalControl-SignoffAttach-ment 215028 | | 1 215030 | ... |
| | | | InternalControl-SignoffID 215034 | 1 215036 | InternalControlSignoffID 215038 |
| | | | ReportingLine-UnitID 215040 | 1 215042 | OrganisationalCentreID 215044 |

FIG. 215-2

| Package | | level 1 | level 2 | level 3 | Cardinality | Datatype Name |
|---|---|---|---|---|---|---|
| | | | | StartDate 215046 | 1 215048 | StartDate 215050 |
| | | | | EndDate 215052 | 1 215054 | EndDate 215056 |

FIG. 216

| Package | level 1 | level 2 | level 3 | Cardinality | Datatype Name |
|---|---|---|---|---|---|
| InternalControlSignoffAttachmentbyIDResponse 216000 | InternalControlSignoffAttachmentbyIDResponse 216002 | | | | InternalControlSignoffAttachmentbyIDResponse 216004 |
| MessageHeader 216006 | | MessageHeader 216008 | | 1 216010 | BusinessDocumentMessageHeader 216012 |
| | | | ID 216014 | 1 216016 | BusinessDocumentMessageID 216018 |
| | | | CreationDateTime 216020 | 1 216022 | DateTime 216024 |
| InternalControlSignoff 216026 | | InternalControlSignoff 216028 | | 0...1 216030 | ... |
| | | | ID 216034 | 1 216036 | InternalControlSignoffID 216038 |
| Attachment 216040 | | | Attachment 216042 | 0...n 216044 | AttachmentFolder 216046 |

FIG. 217

| Package | level 1 | level 2 | level 3 | Cardinality | Datatype Name |
|---|---|---|---|---|---|
| InternalControl-SignoffAttach-mentCancelCon-firmation 217000 | InternalControl-SignoffAttach-mentCancelCon-firmation 217002 | | | | InternalControlSignoffAttach-mentCancelConfirmation 217004 |
| Message-Header 217006 | | MessageHeader 217008 | | 1 217010 | BusinessDocumentMessage-Header 217012 |
| | | | ID 217014 | 1 217016 | BusinessDocumentMessageID 217018 |
| | | | CreationDateTime 217020 | 1 217022 | DateTime 217024 |
| Log 217026 | | Log 217028 | | 1 217030 | Log 217032 |

FIG. 218-1

| Package | level 1 | level 2 | level 3 | Cardinality | Datatype Name |
|---|---|---|---|---|---|
| InternalControlSignoffAttachmentCancelRequest 218000 | InternalControlSignoffAttachmentCancelRequest 218002 | | | | InternalControlSignoffAttachmentCancelRequest 218004 |
| MessageHeader 218006 | | MessageHeader 218008 | | 1 218010 | BusinessDocumentMessageHeader 218012 |
| | | | ID 218014 | 1 218016 | BusinessDocumentMessageID 218018 |
| | | | CreationDateTime 218020 | 1 218022 | DateTime 218024 |
| SignOffAttachment 218026 | | InternalControlSignOff 218028 | | 1 218030 | … |
| | | | ID 218034 | 1 218036 | InternalControlSignoffID 218038 |
| | | | ReportingLineUnitID 218040 | 1 218042 | OrganisationalCentreID 218044 |

FIG. 218-2

| Package | | level 1 | level 2 | level 3 | Cardinality | Datatype Name |
|---|---|---|---|---|---|---|
| | | | | StartDate 218046 | 1 218048 | StartDate 218050 |
| | | | | EndDate 218052 | 1 218054 | EndDate 218056 |
| | | | | DocumentCate-goryCode 218058 | 1 218060 | DocumentCategoryCode 218062 |
| | | | | AttachmentID 218064 | 1 218066 | AttachmentID 218068 |

FIG. 219

| Package | level 1 | level 2 | level 3 | Cardinality | Datatype Name |
|---|---|---|---|---|---|
| InternalControlSignoffAttachmentCreateConfirmation 219000 | InternalControlSignoffAttachmentCreateConfirmation 219002 | | | | InternalControlSignoffAttachmentCreateConfirmation 219004 |
| MessageHeader 219006 | | MessageHeader 219008 | | 1 219010 | BusinessDocumentMessageHeader 219012 |
| | | | ID 219014 | 1 219016 | BusinessDocumentMessageID 219018 |
| | | | CreationDateTime 219020 | 1 219022 | DateTime 219024 |
| Log 219026 | | Log 219028 | | 1 219030 | Log 219032 |

FIG. 220-1

| Package | level 1 | level 2 | level 3 | Cardinality | Datatype Name |
|---|---|---|---|---|---|
| InternalControl-SignoffAttach-mentCreateRe-quest 220000 | InternalControl-SignoffAttach-mentCreateRe-quest 220002 | | | | InternalControlSignoffAttach-mentCreateRequest 220004 |
| Message-Header 220006 | | MessageHeader 220008 | | 1 220010 | BusinessDocumentMessage-Header 220012 |
| | | | ID 220014 | 1 220016 | BusinessDocumentMessageID 220018 |
| | | | Creation-DateTime 220020 | 1 220022 | DateTime 220024 |
| InternalCon-trolSignOffAt-tachment 220026 | | InternalControl-SignOff 220028 | | 1 220030 | ... |
| | | | ID 220032 | 1 220034 | InternalControlSignoffID 220036 |
| | | | ReportingLine-UnitID 220038 | 1 220040 | OrganisationalCentreID 220042 |

FIG. 220-2

| Package | level 1 | level 2 | level 3 | Cardinality | Datatype Name |
|---|---|---|---|---|---|
| | | | StartDate 220044 | 1 220046 | StartDate 220048 |
| | | | EndDate 220050 | 1 220052 | EndDate 220054 |
| | | Attachment 220056 | | | |
| | | | DocumentCategoryCode 220058 | 1 220060 | DocumentCategoryCode 220062 |
| | | | DocumentName 220064 | 1 220066 | DocumentName 220068 |
| | | | FileContentBinaryObject 220070 | 0...1 220072 | FileContentBinaryObject 220074 |
| | | | DocumentPathName 220076 | 0...1 220078 | DocumentPathName 220080 |

FIG. 221-1

| Package | level 1 | level 2 | level 3 | Cardinality | Datatype Name |
|---|---|---|---|---|---|
| InternalControl-SignoffbyIDQuery 221000 | InternalControl-SignoffbyIDQuery 221002 | | | | InternalControlSignoffbyID-Query 221004 |
| Message-Header 221006 | | MessageHeader 221008 | | 1 221010 | BusinessDocumentMessage-Header 221012 |
| | | | ID 221014 | 1 221016 | BusinessDocumentMessageID 221018 |
| | | | Creation-DateTime 221020 | 1 221022 | DateTime 221024 |
| Selection 221026 | | InternalControl-Signoff 221028 | | 1 221030 | ... |
| | | | ID 221032 | 0...1 221034 | InternalControlSignoffID 221036 |
| | | | ReportingLine-Unit_ID 221038 | 0...1 221040 | OrganisationalCentreID 221042 |
| | | | StartDate 221044 | 0...1 221046 | StartDate 221048 |

FIG. 221-2

| Package | | level 1 | level 2 | level 3 | Cardinality | Datatype Name |
|---|---|---|---|---|---|---|
| | | | | EndDate 221050 | 0...1 221052 | EndDate 221054 |

FIG. 222-1

| Package | level 1 | level 2 | level 3 | Cardinality | Datatype Name |
|---|---|---|---|---|---|
| InternalControl-SignoffbyIDRe-sponse 222000 | InternalControl-SignoffbyIDRe-sponse 222002 | | | | InternalControlSignoffbyIDRe-sponse 222004 |
| Message-Header 222006 | | MessageHeader 222008 | | 1 222010 | BusinessDocumentMessage-Header 222012 |
| | | | ID 222014 | 1 222016 | BusinessDocumentMessageID 222018 |
| | | | Creation-DateTime 222020 | 1 222022 | DateTime 222024 |
| InternalCon-trolSignoff 222026 | | InternalControl-Signoff 222028 | | 0...1 222030 | ... |
| | | | SignOffID 222032 | 1 222034 | SingoffID 222036 |
| | | | ReportingLine-UnitID 222038 | 1 222040 | OrganisationalCentreID 222042 |

FIG. 222-2

| Package | level 1 | level 2 | level 3 | Cardinality | Datatype Name |
|---|---|---|---|---|---|
| | | | ReportingLine-UnitName 222044 | 1 222046 | MEDIUM_Name 222048 |
| | | | TimeframeName 222050 | 1 222052 | MEDIUM_Name 222054 |
| | | | TimeframeStart-Date 222056 | 1 222058 | StartDate 222060 |
| | | | TimeframeEnd-Date 222062 | 1 222064 | EndDate 222066 |
| | | | SignoffComplet-edIndicator 222068 | 1 222070 | CompletedIndicator 222072 |
| | | | InternalControl-SignoffStatus-Name 222074 | 1 222076 | SHORT_Name 222078 |
| | | | Note 222080 | 1 222082 | Note 222084 |

FIG. 222-3

| Package | level 1 | level 2 | level 3 | Cardinality | Datatype Name |
|---|---|---|---|---|---|
| | | | SignoffDate 222086 | 1 222088 | BusinessTransactionDocumentDate 222090 |
| | | | IssueTotalNumberValue 222092 | 1 222094 | TotalNumberValue 222096 |
| | | | OpenIssueTotalNumberValue 222098 | 1 2220100 | TotalNumberValue 2220102 |
| | | | AttachmentTotalNumberValue 2220104 | 1 2220106 | TotalNumberValue 2220108 |
| | | | SignoffDisclaimerNote 2220110 | 1 2220112 | Note 2220114 |
| | | | ResponsibleBusinessPartnerInternalID 2220116 | 0...1 2220118 | BusinessPartnerInternalID 2220120 |
| | | | ResponsibleName 2220122 | 0...1 2220124 | PersonFormattedName 2220126 |

FIG. 222-4

| Package | level 1 | level 2 | level 3 | Cardinality | Datatype Name |
|---|---|---|---|---|---|
| | | | ResponsibleE-mailAddress 2220128 | 0...1 2220130 | EmailAddress 2220132 |
| | | | SignedByBusinessPartnerInternalID 2220134 | 1 2220136 | BusinessPartnerInternalID 2220138 |
| | | | SignedByName 2220140 | 1 2220142 | PersonFormattedName 2220144 |
| | | | SignedByE-mailAddress 2220146 | 1 2220148 | EmailAddress 2220150 |
| Attachment 2220152 | | | Attachment 2220154 | 0...n 2220156 | AttachmentFolder 2220158 |

FIG. 223-1

| Package | level 1 | level 2 | level 3 | Cardinality | Datatype Name |
|---|---|---|---|---|---|
| InternalControl-SignoffbyPerform-Request 223000 | InternalControl-SignoffbyPer-formRequest 223002 | | | | InternalControlSignoffby-IDPerformRequest 223004 |
| Message-Header 223006 | | MessageHeader 223008 | | 1 223010 | BusinessDocumentMes-sageHeader 223012 |
| | | | ID 223014 | 1 223016 | BusinessDocumentMes-sageID 223018 |
| | | | Creation-DateTime 223020 | 1 223022 | DateTime 223024 |
| InternalCon-trolSignoff 223026 | | InternalControl-Signoff 223028 | | 0...1 223030 | ... |
| | | | ID 223034 | 1 223036 | InternalControlSignoffID 223038 |
| | | | SignoffCom-pletedIndicator 223040 | 1 223042 | CompletedIndicator 223044 |

FIG. 223-2

| Package | level 1 | level 2 | level 3 | Cardinality | Datatype Name |
| --- | --- | --- | --- | --- | --- |
| | | | Note 223046 | 0...1 223048 | Note 223050 |

FIG. 224

| Package | level 1 | level 2 | level 3 | Cardinality | Datatype Name |
|---|---|---|---|---|---|
| InternalControl-SignoffPerform-Confirmation 224000 | InternalControl-SignoffPerform-Confirmation 224002 | | | | InternalControlSignoffPerform-Confirmation 224004 |
| Message-Header 224006 | | MessageHeader 224008 | | 1 224010 | BusinessDocumentMessage-Header 224012 |
| | | | ID 224014 | 1 224016 | BusinessDocumentMessageID 224018 |
| | | | Creation-DateTime 224020 | 1 224022 | DateTime 224024 |
| Log 224026 | | Log 224028 | | 1 224030 | Log 224032 |

FIG. 230-1

| Package | level 1 | level 2 | level 3 | Cardinality | Datatype Name |
|---|---|---|---|---|---|
| MaintenanceIssueCategoryCatalogueCategoryByIDQueryMessage_sync 230000 | MaintenanceIssueCategoryCatalogueCategoryByIDQueryMessage_sync 230002 | | | | MaintenanceIssueCategoryCatalogueCategoryByIDQueryMessage_sync 230004 |
| Selection 230006 | | MaintenanceIssueCategoryCatalogueCategorySelectionByID 230008 | | 1 230010 | MaintenanceIssueCategoryCatalogueSelectionByID 230012 |
| | | | ID 230014 | 1 230016 | MaintenanceIssueCategoryCatalogueID 230018 |
| | | | CategoryParentMaintenanceIssueCategoryID 230020 | 0..1 230022 | MaintenanceIssueCategoryID (qualifier: Parent) 230024 |
| | | | ProfileIssueCategoryFilterCode 230026 | 0..1 230028 | IssueCategoryFilterCode 230030 |

FIG. 230-2

| Package | level 1 | level 2 | level 3 | Cardinality | Datatype Name |
|---|---|---|---|---|---|
| | | | LanguageCode 230032 | 0..1 230034 | LanguageCode 230036 |

FIG. 231-1

| Package | level 1 | level 2 | level 3 | level 4 | Cardinality | Datatype Name |
|---|---|---|---|---|---|---|
| MaintenanceIssueCategoryCatalogueCategoryByIDResponseMessage_sync 231000 | MaintenanceIssueCategoryCatalogueCategoryByIDResponseMessage_sync 231002 | | | | | MaintenanceIssueCategoryCatalogueMessage_sync 231004 |
| MaintenanceIssueCategoryCatalogue 231006 | | MaintenanceIssueCategoryCatalogue 231008 | | | 0..1 231010 | ... |
| | | | ID 231012 | | 1 231014 | MaintenanceIssueCategoryCatalogueID 231016 |
| | | | MaintenanceIssueCategoryTypeCode 231018 | | 1 231020 | MaintenanceIssueCategoryTypeCode 231022 |

FIG. 231-2

| Package | level 1 | level 2 | level 3 | level 4 | Cardinality | Datatype Name |
|---|---|---|---|---|---|---|
| | | | Name 231024 | | 0..1 231026 | MEDIUM_Name (Qualifier: Catalogue) 231028 |
| | | | MaintenanceIssueCategoryTypeName 231030 | | 0..1 231032 | MEDIUM_Name (Qualifier: CategoryType) 231034 |
| Category 231036 | | | Category 231038 | | 0..n 231040 | ... |
| | | | | MaintenanceIssueCategoryID 231042 | 1 231044 | MaintenanceIssueCategoryID 231046 |
| | | | | ParentMaintenanceIssueCategoryID 231048 | 0..1 231050 | MaintenanceIssueCategoryID (qualifier: Parent) 231052 |

FIG. 231-3

| Package | level 1 | level 2 | level 3 | level 4 | Cardinality | Datatype Name |
|---|---|---|---|---|---|---|
| | | | | Mainte-nanceIssue-CategoryName 231054 | 0..1 231056 | MEDIUM_Name (quali-fier: Category) 231058 |
| | | | | Mainte-nanceIssue-CategoryDe-scription 231060 | 0..1 231062 | MEDIUM_Description (qualifier: Category) 231064 |
| Log 231066 | | Log 231068 | | | 1 231070 | Log 231072 |

FIG.232

| Package | level 1 | level 2 | level 3 | Cardinality | Datatype Name |
|---|---|---|---|---|---|
| MaintenanceIssueCategoryCatalogueSimpleByProfileMaintenanceRequestTypeCodeQueryMessage_sync 232000 | MaintenanceIssueCategoryCatalogueSimpleByProfileMaintenanceRequestTypeCodeQueryMessage_sync 232002 | | | | MaintenanceIssueCategoryCatalogueSimpleByProfileMaintenanceRequestTypeCodeQueryMessage_sync 232004 |
| Selection 232006 | | MaintenanceIssueCategoryCatalogueSimpleSelectionByProfileMaintenanceRequestTypeCode 232008 | | 1 232010 | MaintenanceIssueCategoryCatalogueSimpleSelectionByProfileMaintenanceRequestTypeCode 232012 |
| | | | ProfileMaintenanceRequestTypeCode 232014 | 1 232016 | MaintenanceRequestTypeCode 232018 |
| | | | LanguageCode 232020 | 0..1 232022 | LanguageCode 232024 |

FIG. 233-1

| Package | level 1 | level 2 | level 3 | Cardinality | Datatype Name |
|---|---|---|---|---|---|
| MaintenanceIssueCategoryCatalogueSimpleByProfile-MaintenanceRequestTypeCodeResponseMessage_sync 233000 | MaintenanceIssueCategoryCatalogueSimpleByProfileMaintenanceRequest-TypeCodeResponseMessage_sync 233002 | | | | MaintenanceIssueCategoryCatalogueSimpleByProfileMaintenanceRequestTypeCodeResponseMessage_sync 233004 |
| Mainte-nanceIssue-CategoryCatalogue 233006 | | MaintenanceIssueCategory-Catalogue 233008 | | 0..n 233010 | ... |
| | | | ID 233012 | 1 233014 | MaintenanceIssueCategory-CatalogueID 233016 |
| | | | MaintenanceIssueCategoryTypeCode 233018 | 1 233020 | MaintenanceIssueCategory-CatalogueTypeCode 233022 |
| | | | MaintenanceIssueCategoryTypeName 233024 | 0..1 233026 | MEDIUM_Name (qualifier: CategoryType) 233028 |

FIG. 233-2

| Package | level 1 | level 2 | level 3 | Cardinality | Datatype Name |
|---|---|---|---|---|---|
| | | | Name 233030 | 0..1 233032 | MEDIUM_Name (qualifier: Catalogue) 233034 |
| Log 233036 | | Log 233040 | | 1 233042 | Log 233044 |

FIG. 242

| Package | level 1 | level 2 | level 3 | Cardinality | Datatype Name |
|---|---|---|---|---|---|
| MaintenanceOrderAllowedMaintenancePlannerGroupByMaintenancePlanningPlantQueryMessage_sync 242000 | MaintenanceOrderAllowedMaintenancePlannerGroupByMaintenancePlanningPlantQueryMessage_sync 242002 | | | | MaintenanceOrderAllowedMaintenancePlannerGroupByMaintenancePlanningPlantQueryMessage_sync 242004 |
| Selection 242006 | | MaintenanceOrderAllowedMaintenancePlannerGroupSelectionByMaintenancePlanningPlant 242008 | | 1 242010 | |
| | | | MaintenancePlanningPlantID 242012 | 1 242014 | PlantID 242016 |

FIG. 243

| Package | | level 1 | level 2 | level 3 | Cardinality | Datatype Name |
|---|---|---|---|---|---|---|
| MaintenanceOrderAllowedMaintenancePlannerGroupByMaintenancePlanningPlant-ResponseMessage_sync 243000 | | MaintenanceOrderAllowedMaintenancePlannerGroup-ByMaintenance-PlanningPlantResponseMessage_sync 243002 | | | | MaintenanceOrderAllowedMaintenancePlannerGroupByMaintenance-PlanningPlantResponseMessage_sync 243004 |
| | MaintenanceOrder 243006 | | MaintenanceOrderAllowedMaintenancePlanner-Group 243008 | | 0..n 243010 | |
| | | | | Code 243012 | 1 243014 | MaintenancePlannerGroupCode 243016 |
| | | | | Name 243018 | 0..1 243020 | LANGUAGEINDEPENDENT_LEN18_Name 243022 |
| | Log 243024 | | Log 243026 | | 1 243028 | Log 243030 |

FIG. 244

| Package | level 1 | level 2 | level 3 | Cardinality | Datatype Name |
|---|---|---|---|---|---|
| MaintenanceOrderAllowedUserStatusByIDQueryMessage_sync 244000 | MaintenanceOrderAllowedUserStatusByIDQueryMessage_sync 244002 | | | | MaintenanceOrderAllowedUserStatusByIDQueryMessage_sync 244004 |
| Selection 244006 | | MaintenanceOrderAllowedUserStatusSelectionByType 244008 | | 1 244010 | |
| | | | MaintenanceOrderTypeCode 244012 | 1 244014 | MaintenanceOrderTypeCode 244016 |

FIG. 245

| Package | level 1 | level 2 | level 3 | Cardinality | Datatype Name |
|---|---|---|---|---|---|
| MaintenanceOrderAllowedUserStatusByIDResponseMessage_sync 245000 | MaintenanceOrderAllowedUserStatusByIDResponseMessage_sync 245002 | | | | MaintenanceOrderAllowedUserStatusByIDResponseMessage_sync 245004 |
| MaintenanceOrder 245006 | | MaintenanceOrderAllowedUserStatus 245008 | | 0..1 245010 | |
| | | | StatusObject 245012 | 1 245014 | StatusObject 245016 |
| Log 245018 | | Log 245020 | | 1 245022 | Log 245024 |

FIG. 246

| Package | level 1 | level 2 | level 3 | Cardinality | Datatype Name |
|---|---|---|---|---|---|
| MaintenanceOrderMessage 246000 | MaintenanceOrderMessage 246002 | | | | <MessageDataType> 246004 |
| MessageHeader 246006 | | MessageHeader 246008 | | 1 246010 | BusinessDocumentMessageHeader 246012 |
| | | | ID 246014 | 1 246016 | BusinessDocumentMessageID 246018 |
| | | | CreationDateTime 246020 | 1 246022 | DateTime 246024 |
| | | | ... | 0..1 | ... |
| MaintenanceOrder 246028 | | MaintenanceOrder 246030 | | 1 246032 | |
| | | | ID 246034 | 1 246036 | MaintenanceOrderID 246038 |

FIG. 247-1

| Package | level 1 | level 2 | level 3 | level 4 | level 5 | Cardinality | Datatype Name |
|---|---|---|---|---|---|---|---|
| MaintenanceOrder-Message 247000 | Mainte-nanceOr-derMes-sage 247002 | | | | | | <Message-DataType> 247004 |
| MessageHeader 247006 | | Message-Header 247008 | | | | 1 247010 | BusinessDocu-mentMessage-Header 247012 |
| | | | ID 247014 | | | 1 247016 | BusinessDocu-mentMessageID 247018 |
| | | | Creation-DateTime 247020 | | | 1 247022 | DateTime 247024 |
| | | | ... | | | 0..1 247026 | ... |
| MaintenanceOr-der 247028 | | Mainte-nanceOrder 247030 | | | | 0..1 247032 | |

FIG. 247-2

| Package | level 1 | level 2 | level 3 | level 4 | level 5 | Cardinality | Datatype Name |
|---|---|---|---|---|---|---|---|
| | | | ID 247034 | | | 0..1 247036 | MaintenanceOrde-rID 247038 |
| | | | TypeCode 247040 | | | 0..1 247042 | MaintenanceOr-derTypeCode 247044 |
| | | | TypeName 247046 | | | 0..1 247048 | MEDIUM_Name 247050 |
| | | | Mainte-nancePlan-ningPlantID 247052 | | | 0..1 247054 | PlantID 247056 |
| | | | Mainte-nancePlan-ningPlant-Name 247058 | | | 0..1 247060 | LANGUAGEINDEP ENDENT_LEN30_ Name 247062 |
| | | | Accounting-Busines-sAreaCode 247064 | | | 0..1 247066 | AccountingBusi-nessAreaCode 247068 |

FIG. 247-3

| Package | level 1 | level 2 | level 3 | level 4 | level 5 | Cardinality | Datatype Name |
|---|---|---|---|---|---|---|---|
| | | | WorkCentreID 247070 | | | 0..1 247072 | WorkCentreID 247074 |
| | | | WorkCentreName 247076 | | | 0..1 247078 | MEDIUM_Name 247080 |
| | | | WorkCentrePlantID 247082 | | | 0..1 247084 | PlantID 247086 |
| | | | WorkCentrePlantName 247088 | | | 0..1 247090 | LANGUAGEINDEPENDENT_LEN30_Name 247092 |
| | | | MaintenancePlannerGroupCode 247094 | | | 0..1 247096 | MaintenancePlannerGroupCode 247098 |

FIG. 247-4

| Package | level 1 | level 2 | level 3 | level 4 | level 5 | Cardinality | Datatype Name |
|---|---|---|---|---|---|---|---|
| | | | Mainte-nancePlan-nerGroup-Name 2470100 | | | 0..1 2470102 | LANGUAGEINDEPENDENT_LEN18_Name 2470104 |
| | | | Installation-PointID 2470106 | | | 0..1 2470108 | InstallationPointID 2470110 |
| | | | Individual-MaterialID 2470112 | | | 0..1 2470114 | ProductID 2470116 |
| | | | MaterialID 2470118 | | | 0..1 2470120 | ProductInternalID 2470122 |
| | | | SerialID 2470124 | | | 0..1 2470126 | SerialID 2470128 |
| | | | Importance-Code 2470130 | | | 0..1 2470132 | ImportanceCode 2470134 |

FIG. 247-5

| Package | level 1 | level 2 | level 3 | level 4 | level 5 | Cardinality | Datatype Name |
|---|---|---|---|---|---|---|---|
| | | | Description 2470136 | | | 0..1 2470138 | SHORT_Description 2470140 |
| | | | TextCollection 2470142 | | | 0..1 2470144 | TextCollection 2470146 |
| | | | MaintenanceRequestID 2470148 | | | 0..1 2470150 | MaintenanceRequestID 2470152 |
| | | | RequestedExecutionPeriod 2470154 | | | 0..1 2470156 | UPPEROPEN_TIMEZONEINDEPENDENT_DateTimePeriod 2470158 |
| | | | ScheduledExecutionPeriod 2470160 | | | 0..1 2470162 | UPPEROPEN_TIMEZONEINDEPENDENT_DateTimePeriod 2470164 |

FIG. 247-6

| Package | level 1 | level 2 | level 3 | level 4 | level 5 | Cardinality | Datatype Name |
|---|---|---|---|---|---|---|---|
| | | | Actu-alExecution-Period 2470166 | | | 0..1 2470168 | UPPEROPEN_TIMEZONEINDEPENDENT_DateTimePeriod 2470170 |
| | | | SystemAd-ministrative-Data 2470172 | | | 0..1 2470174 | SystemAdministra-tiveData 2470176 |
| | | | Estimated-TotalAmount 2470178 | | | 0..1 2470180 | Amount 2470182 |
| | | | PlannedTo-talAmount 2470184 | | | 0..1 2470186 | Amount 2470188 |
| | | | ActualTota-lAmount 2470190 | | | 0..1 2470192 | Amount 2470194 |
| | | | StatusObject 2470196 | | | 0..1 2470198 | StatusObject 2470200 |

FIG. 247-7

| Package | level 1 | level 2 | level 3 | level 4 | level 5 | Cardinality | Datatype Name |
|---|---|---|---|---|---|---|---|
| Operation 2470202 | | | Operation 2470204 | | | 0..n 2470206 | |
| | | | | ID 2470208 | | 0..1 2470210 | OperationID 2470212 |
| | | | | ActivityID 2470214 | | 0..1 2470216 | OperationActivityID 2470218 |
| | | | | ControlPro-filCode 2470220 | | 0..1 2470222 | OperationControl-ProfilCode 2470224 |
| | | | | WorkCen-treID 2470226 | | 0..1 2470228 | WorkCentreID 2470230 |
| | | | | WorkCen-treName 2470232 | | 0..1 2470234 | MEDIUM_Name 2470236 |
| | | | | WorkCen-trePlantID 2470238 | | 0..1 2470240 | PlantID 2470242 |

FIG. 247-8

| Package | level 1 | level 2 | level 3 | level 4 | level 5 | Cardinality | Datatype Name |
|---|---|---|---|---|---|---|---|
| | | | | WorkCentrePlant-Name 2470244 | | 0..1 2470246 | LANGUAGEINDEPENDENT_LEN30_Name 2470248 |
| | | | | Description 2470250 | | 0..1 2470252 | MEDIUM_Description 2470254 |
| | | | | TextCollection 2470256 | | 0..1 2470258 | TextCollection 2470260 |
| | | | | CalculateOperationWorkloadComponentCode 2470262 | | 0..1 2470264 | OperationWorkloadComponent-Code 2470266 |
| | | | | Resource-ClassID 2470268 | | 0..1 2470270 | ResourceClassID 2470272 |
| | | | | WorkAgreementID 2470274 | | 0..1 2470276 | WorkAgreementID 2470278 |

FIG. 247-9

| Package | level 1 | level 2 | level 3 | level 4 | level 5 | Cardinality | Datatype Name |
|---|---|---|---|---|---|---|---|
| | | | | Employ-eePerson-Formatted-Name 2470280 | | 0..1 2470282 | LANGUAGEINDEPENDENT_LONG_Name 2470284 |
| | | | | PlannedDu-rationQuan-tity 2470286 | | 0..1 2470288 | Duration 2470290 |
| | | | | Planned-WorkQuan-tity 2470292 | | 0..1 2470294 | Quantity 2470296 |
| | | | | Earliest-Execution-Period 2470298 | | 0..1 2470300 | UPPEROPEN_TIMEZONEINDEPENDENT_DateTimePeriod 2470302 |
| | | | | Latest-Execution-Period 2470304 | | 0..1 2470306 | UPPEROPEN_TIMEZONEINDEPENDENT_DateTimePeriod 2470308 |

FIG. 247-10

| Package | level 1 | level 2 | level 3 | level 4 | level 5 | Cardinality | Datatype Name |
|---|---|---|---|---|---|---|---|
| | | | | Actual-WorkQuantity 2470310 | | 0..1 2470312 | Quantity 2470314 |
| | | | | ActualExecutionPeriod 2470316 | | 0..1 2470318 | UPPEROPEN_TIMEZONEINDEPENDENT_DateTimePeriod 2470320 |
| | | | | ForecastEnd-DateTime 2470322 | | 0..1 2470324 | UPPEROPEN_TIMEZONEINDEPENDENT_DateTimePeriod 2470326 |
| | | | | Forecast-WorkQuantity 2470328 | | 0..1 2470330 | Quantity 2470332 |
| | | | | StatusObject 2470334 | | 0..1 2470336 | StatusObject 2470338 |

FIG. 247-11

| Package | level 1 | level 2 | level 3 | level 4 | level 5 | Cardinality | Datatype Name |
|---|---|---|---|---|---|---|---|
| | | | | MaterialIn-put 2470340 | | 0..n 2470342 | |
| | | | | | Reserva-tionID 2470344 | 0..1 2470346 | ReservationID 2470348 |
| | | | | | Reservatio-nItemID 2470350 | 0..1 2470352 | ReservationItemID 2470354 |
| | | | | | GoodsMove mentAllow-edIndicator 2470356 | 0..1 2470358 | Indicator 2470360 |
| | | | | | MaterialID 2470362 | 0..1 2470364 | ProductInternalID 2470366 |
| | | | | | PlantID 2470368 | 0..1 2470370 | PlantID 2470372 |
| | | | | | Inventory-Managed-LocationID 2470374 | 0..1 2470376 | LocationInternalID 2470378 |

FIG. 247-12

| Package | level 1 | level 2 | level 3 | level 4 | level 5 | Cardinality | Datatype Name |
|---|---|---|---|---|---|---|---|
| | | | | | Description 2470380 | 0..1 2470382 | SHORT_Description 2470384 |
| | | | | | TextCollection 2470386 | 0..1 2470388 | TextCollection 2470390 |
| | | | | | LogisticsConfirmationMethodCode 2470392 | 0..1 2470394 | LogisticsConfirmationMethodCode 2470396 |
| | | | | | RequirementQuantity 2470398 | 0..1 2470400 | Quantity 2470402 |
| | | | | | ProcurementEffectivenessConditionCode 2470404 | 0..1 2470406 | ProcurementEffectivenessConditionCode 2470408 |

FIG. 247-13

| Package | level 1 | level 2 | level 3 | level 4 | level 5 | Cardinality | Datatype Name |
|---|---|---|---|---|---|---|---|
| | | | | | Allocated-Quantity 2470410 | 0..1 2470412 | Quantity 2470414 |
| | | | | | Fullfilled-Quantity 2470416 | 0..1 2470418 | Quantity 2470420 |
| Party 2470422 | | | ProductRe-cipientParty 2470424 | | | 0..n 2470426 | |
| | | | | ProductRe-cipientParty 2470428 | | 0..1 2470430 | PartyInternalID 2470432 |
| | | | | ProductRe-cipient-Name 2470434 | | 0..1 2470436 | LANGUAGEINDEPENDENT_MEDIUM_Name 2470438 |
| | | | VendorParty 2470440 | | | 0..n 2470442 | |
| | | | | Vendor-Party 2470444 | | 0..1 2470446 | PartyInternalID 2470448 |

FIG. 247-14

| Package | level 1 | level 2 | level 3 | level 4 | level 5 | Cardinality | Datatype Name |
|---|---|---|---|---|---|---|---|
| | | | | Vendor-Name 2470450 | | 0..1 2470452 | LANGUAGEINDEPENDENT_MEDIUM_Name 2470454 |
| | | | Responsi-bleEmploy-eeParty 2470456 | | | 0..n 2470458 | |
| | | | | Responsi-bleEmploy-eeParty 2470460 | | 0..1 2470462 | PartyInternalID 2470464 |
| | | | | Responsi-bleEmploy-eeName 2470466 | | 0..1 2470468 | LANGUAGEINDEPENDENT_MEDIUM_Name 2470470 |
| CostSet-tlemen-tRule 2470472 | | | CostSettle-mentRule 2470474 | | | 0..n 2470476 | |

FIG. 247-15

| Package | level 1 | level 2 | level 3 | level 4 | level 5 | Cardinality | Datatype Name |
|---|---|---|---|---|---|---|---|
| | | | | Ordinal-Number-Value 2470478 | | 0..1 2470480 | OrdinalNumber-Value 2470482 |
| | | | | Controll-ingSettle-mentType-Code 2470484 | | 0..1 2470486 | ControllingSettle-mentTypeCode 2470488 |
| | | | | Assign-mentPer-cent 2470490 | | 0..1 2470492 | Percent 2470494 |
| | | | | Master-FixedAs-setID 2470496 | | 0..1 2470498 | MasterFixedAs-setID 2470500 |
| | | | | FixedAs-setID 2470502 | | 0..1 2470504 | FixedAssetID 2470506 |

FIG. 247-16

| Package | level 1 | level 2 | level 3 | level 4 | level 5 | Cardinality | Datatype Name |
|---|---|---|---|---|---|---|---|
| | | | | InternalOrderID 2470508 | | 0..1 2470510 | InternalOrderID 2470512 |
| | | | | MaintenanceOrderID 2470514 | | 0..1 2470516 | MaintenanceOrderID 2470518 |
| | | | | CostCentreID 2470520 | | 0..1 2470522 | CostCentreID 2470524 |
| | | | | ProjectNetworkID 2470526 | | 0..1 2470528 | ProjectNetworkID 2470530 |
| | | | | ProjectActivityID 2470532 | | 0..1 2470534 | ProjectActivityID 2470536 |

FIG. 247-17

| Package | level 1 | level 2 | level 3 | level 4 | level 5 | Cardinality | Datatype Name |
|---|---|---|---|---|---|---|---|
| | | | | ProjectWork Break-downStruc-tureElemen-tID 2470538 | | 0..1 2470540 | ProjectWorkBreak-downStructureEle-mentID 2470542 |
| | | | | Gener-alLedger-AccountID 2470544 | | 0..1 2470546 | GeneralLedgerAc-countID 2470548 |
| | | | | ValidToFis-calYearID 2470550 | | 0..1 2470552 | FiscalYearID 2470554 |
| | | | | ValidToAc-countingPe-riodID 2470556 | | 0..1 2470558 | AccountingPeriodID 2470560 |
| | | | | ValidFrom-Fis-calYearID 2470562 | | 0..1 2470564 | FiscalYearID 2470566 |

FIG. 247-18

| Package | level 1 | level 2 | level 3 | level 4 | level 5 | Cardinality | Datatype Name |
|---|---|---|---|---|---|---|---|
| | | | | ValidFro-mAccount-ingPeriodID 2470568 | | 0..1 2470570 | AccountingPeriodID 2470572 |
| Log 2470574 | | Log 2470576 | | | | 0..1 2470578 | Log 2470580 |

FIG. 248-1

| Package | level 1 | level 2 | level 3 | level 4 | level 5 | Cardinality | Datatype Name |
|---|---|---|---|---|---|---|---|
| MaintenanceOrderMessage 248000 | MaintenanceOrderMessage 248002 | | | | | | <MessageDataType> 248004 |
| MessageHeader 248006 | | MessageHeader 248008 | | | | 1 248010 | BusinessDocumentMessageHeader 248012 |
| | | | ID 248014 | | | 1 248016 | BusinessDocumentMessageID 248018 |
| | | | CreationDateTime 248020 | | | 1 248022 | DateTime 248024 |
| | | | ... | | | 0..1 248026 | |
| MaintenanceOrder 248028 | | MaintenanceOrder 248030 | | | | 1 248032 | |

FIG. 248-2

| Package | level 1 | level 2 | level 3 | level 4 | level 5 | Cardinality | Datatype Name |
|---|---|---|---|---|---|---|---|
| | | | ID 248034 | | | 1 248036 | MaintenanceOrderID 248038 |
| | | | Accounting-Busines-sAreaCode 248040 | | | 0..1 248042 | AccountingBusines-sAreaCode 248044 |
| | | | WorkCen-treID 248046 | | | 0..1 248048 | WorkCentreID 248050 |
| | | | WorkCentre-PlantID 248052 | | | 0..1 248054 | PlantID 248056 |
| | | | Mainte-nancePlan-nerGroup-Code 248058 | | | 0..1 248060 | MaintenancePlan-nerGroupCode 248062 |
| | | | Installation-PointID 248064 | | | 0..1 248066 | InstallationPointID 248068 |

FIG. 248-3

| Package | level 1 | level 2 | level 3 | level 4 | level 5 | Cardinality | Datatype Name |
|---|---|---|---|---|---|---|---|
| | | | IndividualMaterialID 248070 | | | 0..1 248072 | ProductID 248074 |
| | | | MaterialID 248076 | | | 0..1 248078 | ProductInternalID 248080 |
| | | | SerialID 248082 | | | 0..1 248084 | SerialID 248086 |
| | | | Importance-Code 248088 | | | 0..1 248090 | ImportanceCode 248092 |
| | | | Description 248094 | | | 0..1 248096 | SHORT_Description 248098 |
| | | | TextCollection 2480100 | | | 0..1 2480102 | TextCollection 2480104 |
| | | | RequestedExecutionPeriod 2480106 | | | 0..1 2480108 | UPPEROPEN_TIMEZONEINDEPENDENT_DateTimePeriod 2480110 |

FIG. 248-4

| Package | level 1 | level 2 | level 3 | level 4 | level 5 | Cardinality | Datatype Name |
|---|---|---|---|---|---|---|---|
| | | | EstimatedTotalAmount 2480112 | | | 0..1 2480114 | Amount 2480116 |
| Operation 2480118 | | | Operation 2480120 | | | 0..n 2480122 | |
| | | | | ActionCode 2480124 | | 1 2480126 | ActionCode 2480128 |
| | | | | ID 2480130 | | 1 2480132 | OperationID 2480134 |
| | | | | ActivityID 2480136 | | 0..1 2480138 | OperationActivityID 2480140 |
| | | | | ControlProfilCode 2480142 | | 0..1 2480144 | OperationControlProfilCode 2480146 |
| | | | | WorkCentreID 2480148 | | 0..1 2480150 | WorkCentreID 2480152 |
| | | | | WorkCentrePlantID 2480154 | | 0..1 2480156 | PlantID 2480158 |

FIG. 248-5

| Package | level 1 | level 2 | level 3 | level 4 | level 5 | Cardinality | Datatype Name |
|---|---|---|---|---|---|---|---|
| | | | | Description 2480160 | | 0..1 2480162 | MEDIUM_Description 2480164 |
| | | | | TextCollection 2480166 | | 0..1 2480168 | TextCollection 2480170 |
| | | | | CalculateOperationWorkloadComponentCode 2480172 | | 0..1 2480174 | OperationWorkloadComponentCode 2480176 |
| | | | | ResourceClassID 2480178 | | 0..1 2480180 | ResourceClassID 2480182 |
| | | | | WorkAgreementID 2480184 | | 0..1 2480186 | WorkAgreementID 2480188 |
| | | | | PlannedDurationQuantity 2480190 | | 0..1 2480192 | Quantity 2480194 |

FIG. 248-6

| Package | level 1 | level 2 | level 3 | level 4 | level 5 | Cardinality | Datatype Name |
|---|---|---|---|---|---|---|---|
| | | | | Planned-WorkQuantity 2480196 | | 0..1 2480198 | Quantity 2480200 |
| | | | | Forecas-tEndDateTime 2480202 | | 0..1 2480204 | UPPEROPEN_TIMEZONEINDEPENDENT_DateTimePeriod 2480206 |
| | | | | Forecast-WorkQuantity 2480208 | | 0..1 2480210 | Quantity 2480212 |
| | | | | MaterialInput 2480214 | | 0..n 2480216 | |
| | | | | | ActionCode 2480218 | 1 2480220 | ActionCode 2480222 |
| | | | | | Reserva-tionID 2480224 | 0..1 2480226 | ReservationID 2480228 |
| | | | | | Reservatio-nItemID 2480230 | 0..1 2480232 | ReservationItemID 2480234 |

FIG. 248-7

| Package | level 1 | level 2 | level 3 | level 4 | level 5 | Cardinality | Datatype Name |
|---|---|---|---|---|---|---|---|
| | | | | | GoodsMovementAllowedIndicator 2480236 | 0..1 2480238 | Indicator 2480240 |
| | | | | | MaterialID 2480242 | 0..1 2480244 | ProductInternalID 2480246 |
| | | | | | PlantID 2480248 | 0..1 2480250 | PlantID 2480252 |
| | | | | | InventoryManagedLocationID 2480254 | 0..1 2480256 | LocationInternalID 2480258 |
| | | | | | Description 2480260 | 0..1 2480262 | SHORT_Description 2480264 |
| | | | | | TextCollection 2480266 | 0..1 2480268 | TextCollection 2480270 |
| | | | | | LogisticsConfirmationMethodCode 2480272 | 0..1 2480274 | LogisticsConfirmationMethodCode 2480276 |

FIG. 248-8

| Package | level 1 | level 2 | level 3 | level 4 | level 5 | Cardinality | Datatype Name |
|---|---|---|---|---|---|---|---|
| | | | | | RequirementQuantity 2480278 | 0..1 2480280 | Quantity 2480282 |
| | | | | | ProcurementEffectivenessConditionCode 2480284 | 0..1 2480286 | ProcurementEffectivenessConditionCode 2480288 |
| Party 2480290 | | | ProductRecipientParty 2480292 | | | 0..n 2480294 | |
| | | | | ActionCode 2480296 | | 1 2480298 | ActionCode 2480300 |
| | | | | ProductRecipientParty 2480302 | | 1 2480304 | PartyInternalID 2480306 |
| | | | VendorParty 2480308 | | | 0..n 2480310 | |

FIG. 248-9

| Package | level 1 | level 2 | level 3 | level 4 | level 5 | Cardinality | Datatype Name |
|---|---|---|---|---|---|---|---|
| | | | | ActionCode 2480312 | | 1 2480314 | ActionCode 2480316 |
| | | | | VendorParty 2480318 | | 1 2480320 | PartyInternalID 2480322 |
| | | | Responsi-bleEmploy-eeParty 2480324 | | | 0..n 2480326 | |
| | | | | ActionCode 2480328 | | 1 2480330 | ActionCode 2480332 |
| | | | | Responsi-bleEmploy-eeParty 2480334 | | 1 2480336 | PartyInternalID 2480338 |
| CostSettle-mentRule 2480340 | | | CostSettle-mentRule 2480342 | | | 0..n 2480344 | |
| | | | | ActionCode 2480346 | | 1 2480348 | ActionCode 2480350 |

FIG. 248-10

| Package | level 1 | level 2 | level 3 | level 4 | level 5 | Cardinality | Datatype Name |
|---|---|---|---|---|---|---|---|
| | | | | OrdinalNum-berValue 2480352 | | 1 2480354 | OrdinalNumberValue 2480356 |
| | | | | Controll-ingSettle-mentType-Code 2480358 | | 0..1 2480360 | ControllingSettle-mentTypeCode 2480362 |
| | | | | Assignment-Percent 2480364 | | 0..1 2480366 | Percent 2480368 |
| | | | | Master-FixedAssetID 2480370 | | 0..1 2480372 | MasterFixedAssetID 2480374 |
| | | | | FixedAssetID 2480376 | | 0..1 2480378 | FixedAssetID 2480380 |
| | | | | InternalOrde-rID 2480382 | | 0..1 2480384 | InternalOrderID 2480386 |

FIG. 248-11

| Package | level 1 | level 2 | level 3 | level 4 | level 5 | Cardinality | Datatype Name |
|---|---|---|---|---|---|---|---|
| | | | | Mainte-nanceOrde-rID 2480388 | | 0..1 2480390 | MaintenanceOrderID 2480392 |
| | | | | CostCentreID 2480394 | | 0..1 2480396 | CostCentreID 2480398 |
| | | | | ProjectNet-workID 2480400 | | 0..1 2480402 | ProjectNetworkID 2480404 |
| | | | | ProjectActiv-ityID 2480406 | | 0..1 2480408 | ProjectActivityID 2480410 |
| | | | | ProjectWork-Breakdown-Structu-reElementID 2480412 | | 0..1 2480414 | ProjectWorkBreak-downStructureEle-mentID 2480416 |
| | | | | Gener-alLedgerAc-countID 2480418 | | 0..1 2480420 | GeneralLedgerAc-countID 2480422 |

FIG. 248-12

| Package | level 1 | level 2 | level 3 | level 4 | level 5 | Cardinality | Datatype Name |
|---|---|---|---|---|---|---|---|
| | | | | ValidToFiscalYearID 2480424 | | 0..1 2480426 | FiscalYearID 2480428 |
| | | | | ValidToAccountingPeriodID 2480430 | | 0..1 2480432 | AccountingPeriodID 2480434 |
| | | | | ValidFromFiscalYearID 2480436 | | 0..1 2480438 | FiscalYearID 2480440 |
| | | | | ValidFromAccountingPeriodID 2480442 | | 0..1 2480444 | AccountingPeriodID 2480446 |

FIG. 249

| Package | level 1 | level 2 | level 3 | Cardinality | Datatype Name |
|---|---|---|---|---|---|
| MaintenanceOrder-Message 249000 | MaintenanceOr-derMessage 249002 | | | | <MessageDataType> 249004 |
| MessageHeader 249006 | | MessageHeader 249008 | | 1 249010 | BusinessDocumentMes-sageHeader 249012 |
| | | | ID 249014 | 1 249016 | BusinessDocumentMes-sageID 249018 |
| | | | CreationDateTime 249020 | 1 249022 | DateTime 249024 |
| | | | ... | 0..1 | ... |
| MaintenanceOrder 249028 | | MaintenanceOrder 249030 | | 0..1 249032 | |
| | | | ID 249034 | 1 249036 | MaintenanceOrderID 249038 |
| Log 249040 | | Log 249042 | | 1 249044 | Log 249046 |

FIG. 250-1

| Package | level 1 | level 2 | level 3 | level 4 | level 5 | Cardinality | Datatype Name |
|---|---|---|---|---|---|---|---|
| Mainte-nanceOrder-Message 250000 | Mainte-nanceOr-derMessage 250002 | | | | | | <Message-DataType> 250004 |
| Message-Header 250006 | | Message-Header 250008 | | | | 1 250010 | BusinessDocu-mentMessage-Header 250012 |
| | | | ID 250014 | | | 1 250016 | BusinessDocu-mentMessageID 250018 |
| | | | Creation-DateTime 250020 | | | 1 250022 | DateTime 250024 |
| | | | ... | | | 0..1 | |

FIG. 250-2

| Package | level 1 | level 2 | level 3 | level 4 | level 5 | Cardinality | Datatype Name |
|---|---|---|---|---|---|---|---|
| Mainte-nanceOrder 250028 | | Mainte-nanceOrder 250030 | | | | 1 250032 | |
| | | | TypeCode 250034 | | | 1 250036 | MaintenanceOrder-TypeCode 250038 |
| | | | Maintenance-PlanningPlan-tID 250040 | | | 0..1 250042 | PlantID 250044 |
| | | | Accounting-Busines-sAreaCode 250046 | | | 0..1 250048 | AccountingBusines-sAreaCode 250050 |
| | | | WorkCentreID 250052 | | | 0..1 250054 | WorkCentreID 250056 |

FIG. 250-3

| Package | level 1 | level 2 | level 3 | level 4 | level 5 | Cardinality | Datatype Name |
|---|---|---|---|---|---|---|---|
| | | | WorkCentre-PlantID 250058 | | | 0..1 250060 | PlantID 250062 |
| | | | Maintenance-Planner-GroupCode 250064 | | | 0..1 250066 | MaintenancePlannerGroupCode 250068 |
| | | | Installation-PointID 250070 | | | 0..1 250072 | InstallationPointID 250074 |
| | | | IndividualMaterialID 250076 | | | 0..1 250078 | ProductID 250080 |
| | | | MaterialID 250082 | | | 0..1 250084 | ProductInternalID 250086 |
| | | | SerialID | | | 0..1 | SerialID |

FIG. 250-4

| Package | level 1 | level 2 | level 3 | level 4 | level 5 | Cardinality | Datatype Name |
|---|---|---|---|---|---|---|---|
| | | | 250088 | | | 250090 | 250092 |
| | | | Importance-Code 250094 | | | 0..1 250096 | ImportanceCode 250098 |
| | | | Description 2500100 | | | 0..1 2500102 | SHORT_Description 2500104 |
| | | | TextCollection 2500106 | | | 0..1 2500108 | TextCollection 2500110 |
| | | | Mainte-nanceReques-tID 2500112 | | | 0..1 2500114 | MaintenanceRe-questID 2500116 |
| | | | Request-edExecution-Period 2500118 | | | 0..1 2500120 | UPPEROPEN_TIMEZONEINDEPENDENT_DateTimePeriod 2500122 |
| | | | EstimatedTo-talAmount 2500124 | | | 0..1 2500126 | Amount 2500128 |
| Opera- | | | Operation | | | 0..n | |

FIG. 250-5

| Package | level 1 | level 2 | level 3 | level 4 | level 5 | Cardinality | Datatype Name |
|---|---|---|---|---|---|---|---|
| tion 2500130 | | | 2500132 | | | 2500134 | |
| | | | | ID 2500136 | | 1 2500138 | OperationID 2500140 |
| | | | | ActivityID 2500142 | | 0..1 2500144 | OperationActivityID 2500146 |
| | | | | ControlProfil-Code 2500148 | | 0..1 2500150 | OperationControl-ProfilCode 2500152 |
| | | | | WorkCentreID 2500154 | | 0..1 2500156 | WorkCentreID 2500158 |
| | | | | WorkCentre-PlantID 2500160 | | 0..1 2500162 | PlantID 2500164 |
| | | | | Description 2500166 | | 0..1 2500168 | MEDIUM_Descriptio n 2500170 |
| | | | | TextCollection 2500172 | | 0..1 2500174 | TextCollection 2500176 |

FIG. 250-6

| Package | level 1 | level 2 | level 3 | level 4 | level 5 | Cardinality | Datatype Name |
|---|---|---|---|---|---|---|---|
| | | | | CalculateOperationWorkloadComponentCode 2500178 | | 0..1 2500180 | OperationWorkloadComponentCode 2500182 |
| | | | | ResourceClassID 2500184 | | 0..1 2500186 | ResourceClassID 2500188 |
| | | | | WorkAgreementID 2500190 | | 0..1 2500192 | WorkAgreementID 2500194 |
| | | | | PlannedDurationQuantity 2500196 | | 0..1 2500198 | Quantity 2500200 |
| | | | | PlannedWorkQuantity 2500202 | | 0..1 2500204 | Quantity 2500206 |

FIG. 250-7

| Package | level 1 | level 2 | level 3 | level 4 | level 5 | Cardinality | Datatype Name |
|---|---|---|---|---|---|---|---|
| | | | | MaterialInput 2500208 | | 0..n 2500210 | |
| | | | | | GoodsMovementAllowedIndicator 2500212 | 0..1 2500214 | Indicator 2500216 |
| | | | | | MaterialID 2500218 | 0..1 2500220 | ProductInternalID 2500222 |
| | | | | | PlantID 2500224 | 0..1 2500226 | PlantID 2500228 |
| | | | | | InventoryManagedLocationID 2500230 | 0..1 2500232 | LocationInternalID 2500234 |
| | | | | | Description 2500236 | 0..1 2500238 | SHORT_Description 2500240 |
| | | | | | LogisticsConfirmationMethodCode 2500242 | 0..1 2500244 | LogisticsConfirmationMethodCode 2500246 |

FIG. 250-8

| Package | level 1 | level 2 | level 3 | level 4 | level 5 | Cardinality | Datatype Name |
|---|---|---|---|---|---|---|---|
| | | | | | 2500242 | | |
| | | | | | Require-mentQuantity 2500248 | 0..1 2500250 | Quantity 2500252 |
| | | | | | Procure-mentEffective-nessCondi-tionCode 2500254 | 0..1 2500256 | ProcurementEffec-tivenessCondition-Code 2500258 |
| Party 2500260 | | | ProductRe-cipientParty 2500262 | | | 0..n 2500264 | |
| | | | | ProductRecipi-entParty 2500266 | | 0..1 2500268 | PartyInternalID 2500270 |
| | | | VendorParty | | | 0..n | |

FIG. 250-9

| Package | level 1 | level 2 | level 3 | level 4 | level 5 | Cardinality | Datatype Name |
|---|---|---|---|---|---|---|---|
| | | | 2500272 | | | 2500274 | |
| | | | | VendorParty 2500276 | | 0..1 2500278 | PartyInternalID 2500280 |
| | | | ResponsibleEmployeeParty 2500282 | | | 0..n 2500284 | |
| | | | | ResponsibleEmployeeParty 2500286 | | 0..1 2500288 | PartyInternalID 2500290 |
| CostSettlementRule 2500292 | | | CostSettlementRule 2500294 | | | 0..n 2500296 | |
| | | | | OrdinalNumberValue 2500298 | | 1 2500300 | OrdinalNumberValue 2500302 |
| | | | | ControllingSettlementTypeCode | | 0..1 2500306 | ControllingSettlementTypeCode |

FIG. 250-10

| Package | level 1 | level 2 | level 3 | level 4 | level 5 | Cardinality | Datatype Name |
|---|---|---|---|---|---|---|---|
| | | | | 2500304 | | | 2500308 |
| | | | | AssignmentPer-cent 2500310 | | 0..1 2500312 | Percent 2500314 |
| | | | | MasterFixedAs-setID 2500316 | | 0..1 2500318 | MasterFixedAssetID 2500320 |
| | | | | FixedAssetID 2500322 | | 0..1 2500324 | FixedAssetID 2500326 |
| | | | | IntenalOrderID 2500328 | | 0..1 2500330 | InternalOrderID 2500332 |
| | | | | Mainte-nanceOrderID 2500334 | | 0..1 2500336 | MaintenanceOrde-rID 2500338 |
| | | | | CostCentreID 2500340 | | 0..1 2500342 | CostCentreID 2500344 |
| | | | | ProjectNet-workID | | 0..1 | ProjectNetworkID |

FIG. 250-11

| Package | level 1 | level 2 | level 3 | level 4 | level 5 | Cardinality | Datatype Name |
|---|---|---|---|---|---|---|---|
| | | | | 2500346 | | 2500348 | 2500350 |
| | | | | ProjectActivityID 2500352 | | 0..1 2500354 | ProjectActivityID 2500356 |
| | | | | ProjectWork-Breakdown-StructureEle-mentID 2500358 | | 0..1 2500360 | ProjectWorkBreak-downStructureEle-mentID 2500362 |
| | | | | GeneralLedger-AccountID 2500364 | | 0..1 2500366 | GeneralLedgerAc-countID 2500368 |
| | | | | ValidToFis-calYearID 2500370 | | 0..1 2500372 | FiscalYearID 2500374 |
| | | | | ValidToAccount-ingPeriodID 2500376 | | 0..1 2500378 | AccountingPeriodID 2500380 |
| | | | | ValidFromFis-calYearID | | 0..1 2500384 | FiscalYearID 2500386 |

FIG. 250-12

| Package | level 1 | level 2 | level 3 | level 4 | level 5 | Cardinality | Datatype Name |
|---|---|---|---|---|---|---|---|
| | | | | 2500382 | | | |
| | | | | ValidFromAccountingPeriodID 2500388 | | 0..1 2500390 | AccountingPeriodID 2500392 |

FIG. 251-1

| Package | level 1 | level 2 | level 3 | Cardinality | Datatype Name |
|---|---|---|---|---|---|
| MaintenanceOrder-Message 251000 | MaintenanceOrderMessage 251002 | | | | <MessageDataType> 251004 |
| MessageHeader 251006 | | MessageHeader 251008 | | 1 251010 | BusinessDocumentMessageHeader 251012 |
| | | | ID 251014 | 1 251016 | BusinessDocumentMessageID 251018 |
| | | | CreationDateTime 251020 | 1 251022 | DateTime 251024 |
| | | | ... | 0..1 | ... |
| MaintenanceOrder 251028 | | Selection 251030 | | 0..1 251032 | |
| | | | MaintenanceOrder-TypeCodeIInterval-BoundaryTypeCode 251034 | 0..1 251036 | IntervalBoundaryTypeCode 251038 |

FIG. 251-2

| Package | level 1 | level 2 | level 3 | Cardinality | Datatype Name |
|---|---|---|---|---|---|
| | | | UpperMaintenanceOrderTypeCode 251040 | 0..1 251042 | MaintenanceOrderTypeCode 251044 |
| | | | LowerMaintenanceOrderTypeCode 251046 | 0..1 251048 | MaintenanceOrderTypeCode 251050 |
| | | | ResourceIDIntervalBoundaryTypeCode 251052 | 0..1 251054 | IntervalBoundaryTypeCode 251056 |
| | | | UpperResourceID 251058 | 0..1 251060 | ResourceID 251062 |
| | | | LowerResourceID 251064 | 0..1 251066 | ResourceID 251068 |
| | | | Plant???IntervalBoundaryTypeCode 251070 | 0..1 251072 | IntervalBoundaryTypeCode 251074 |
| | | | UpperPlant??? 251076 | 0..1 251078 | ??? 251080 |
| | | | LowerPlant??? | 0..1 | ??? |

FIG. 251-3

| Package | level 1 | level 2 | level 3 | Cardinality | Datatype Name |
|---|---|---|---|---|---|
| | | | 251082 | 251084 | 251086 |
| | | | MaintenancePlanner-GroupCodeInterval-BoundaryTypeCode 251088 | 0..1 251090 | IntervalBoundaryTypeCode 251092 |
| | | | UpperMaintenancePlan-nerGroupCode 251094 | 0..1 251096 | MaintenancePlannerGroup-Code 251098 |
| | | | LowerMaintenancePlan-nerGroupCode 2510100 | 0..1 2510102 | MaintenancePlannerGroup-Code 2510104 |
| | | | Planning-Plant???IntervalBoundaryTypeCode 2510106 | 0..1 2510108 | IntervalBoundaryTypeCode 2510110 |
| | | | PlanningPlant??? 2510112 | 0..1 2510114 | Plant??? 2510116 |
| | | | PlanningPlant??? 2510118 | 0..1 2510120 | Plant??? 2510122 |

FIG. 251-4

| Package | level 1 | level 2 | level 3 | Cardinality | Datatype Name |
|---|---|---|---|---|---|
| | | | InstallationPointIDInter-valBoundaryTypeCode 2510124 | 0..1 2510126 | IntervalBoundaryTypeCode 2510128 |
| | | | UpperInstallationPointID 2510130 | 0..1 2510132 | InstallationPointID 2510134 |
| | | | LowerInstallationPointID 2510136 | 0..1 2510138 | InstallationPointID 2510140 |
| | | | IndividualMaterialID-IntervalBoundaryType-Code 2510142 | 0..1 2510144 | IntervalBoundaryTypeCode 2510146 |
| | | | UpperIndividualMateri-alID 2510148 | 0..1 2510150 | IndividualMaterialID 2510152 |
| | | | LowerIndividualMateri-alID 2510154 | 0..1 2510156 | IndividualMaterialID 2510158 |
| | | | PriorityCodeInterval-BoundaryTypeCode 2510160 | 0..1 2510162 | IntervalBoundaryTypeCode 2510164 |

FIG. 251-5

| Package | level 1 | level 2 | level 3 | Cardinality | Datatype Name |
|---|---|---|---|---|---|
| | | | UpperPriorityCode 2510166 | 0..1 2510168 | PriorityCode 2510170 |
| | | | LowerPriorityCode 2510172 | 0..1 2510174 | PriorityCode 2510176 |
| | | | Period 2510178 | 0..1 2510180 | DateTimeInterval 2510182 |
| | | | LifeCyleStatusCodeIn-tervalBoundaryType-Code 2510184 | 0..1 2510186 | IntervalBoundaryTypeCode 2510188 |
| | | | UpperLifeCyleStatus-Code 2510190 | 0..1 2510192 | LogisticsOrderLifeCyleS-tatusCode 2510194 |
| | | | LowerLifeCyleStatus-Code 2510196 | 0..1 2510198 | LogisticsOrderLifeCyleS-tatusCode 2510200 |

FIG. 252

| Package | level 1 | level 2 | level 3 | Cardinality | Datatype Name |
|---|---|---|---|---|---|
| MaintenanceOrderMessage 252000 | MaintenanceOrderMessage 252002 | | | | <MessageDataType> 252004 |
| MessageHeader 252006 | | MessageHeader 252008 | | 1 252010 | BusinessDocumentMessageHeader 252012 |
| | | | ID 252014 | 1 252016 | BusinessDocumentMessageID 252018 |
| | | | Creatio-DateTime 252020 | 1 252022 | DateTime 252024 |
| | | | ... | 0..1 | ... |
| MaintenanceOrder 252028 | | MaintenanceOrder 252030 | | 0..n 252032 | |
| | | | ID 252034 | 0..1 252036 | MaintenanceOrderID 252038 |
| | | | MaintenanceOrderDescription 252040 | 0..1 252042 | SHORT_Description 252044 |
| Log 252046 | | Log 252048 | | 0..1 252050 | Log 252052 |

FIG. 269-1

| Package | | level 1 | level 2 | level 3 | Cardinality | Datatype Name |
|---|---|---|---|---|---|---|
| MaintenanceRequestAllowedActivityGroupAndActivityByElementsQueryMessage_sync 26900 | | MaintenanceRequestAllowedActivityGroupAndActivityByElementsQueryMessage_sync 26902 | | | | MaintenanceRequestAllowedActivityGroupAndActivityByElementsQueryMessage_sync 26904 |
| | Selection 26906 | | MaintenanceRequestAllowedActivityGroupAndActivitySelectionByElements 26908 | | 1 26910 | |
| | | | | MaintenanceRequestTypeCode 26912 | 1 26914 | MaintenanceRequestTypeCode 26916 |
| | | | | MaintenanceRequestInstallationPointID 26918 | 0..1 26920 | InstallationPointID 26922 |

FIG. 269-2

| Package | | level 1 | level 2 | level 3 | Cardinality | Datatype Name |
|---|---|---|---|---|---|---|
| | | | | MaintenanceRequestIndividualMaterialID 26924 | 0..1 26926 | ProductInternalID 26928 |

FIG. 270-1

| Package | level 1 | level 2 | level 3 | Cardinality | Datatype Name |
|---|---|---|---|---|---|
| MaintenanceRequestAllowedActivityGroupAndActivityByElementsResponseMessage_sync 27000 | MaintenanceRequestAllowedActivityGroupAndActivityByElementsResponseMessage_sync 27002 | | | | MaintenanceRequestAllowedActivityGroupAndActivityByElementsResponseMessage_sync 27004 |
| MaintenanceRequest 27006 | | MaintenanceRequestAllowedActivityGroupAndActivity 27008 | | 1 27010 | |
| | | | ActivityGroupCode 27012 | 1 27014 | MaintenanceRequestActivityGroupCode 27016 |
| | | | ActivityGroupName 27018 | 0..1 27020 | MEDIUM_Name 27022 |

FIG. 270-2

| Package | | level 1 | level 2 | level 3 | Cardinality | Datatype Name |
|---|---|---|---|---|---|---|
| | | | | ActivityCode 27024 | 1 27026 | MaintenanceRequestActivityCode 27028 |
| | | | | ActivityName 27030 | 0..1 27032 | MEDIUM_Name 27034 |
| | Log 27036 | | Log 27038 | | 1 27040 | Log 27042 |

FIG. 271-1

| Package | | level 1 | level 2 | level 3 | Cardinality | Datatype Name |
|---|---|---|---|---|---|---|
| MaintenanceRequestAllowedIssueCauseGroupAndIssue-CauseByElementsQuery-Message_sync 27100 | | MaintenanceRequestAllow-edIssue-CauseGrou-pAndIssue-CauseByEle-mentsQuery-Message_sync 27102 | | | | MaintenanceRequestAllowedIssueCauseGroupAndIssue-CauseByElementsQuery-Message_sync 27104 |
| | Selection 27106 | | MaintenanceRequestAllowedIs-sueCauseGrou-pAndIssue-CauseSelec-tionByElements 27108 | | 1 27110 | |
| | | | | Mainte-nanceRequest-TypeCode 27112 | 1 27114 | MaintenanceRequestType-Code 27116 |

FIG. 271-2

| Package | | level 1 | level 2 | level 3 | Cardinality | Datatype Name |
|---|---|---|---|---|---|---|
| | | | | MaintenanceRequestInstallationPointID 27118 | 0..1 27120 | InstallationPointID 27122 |
| | | | | MaintenanceRequestIndividualMaterialID 27124 | 0..1 27126 | ProductInternalID 27128 |

FIG. 272-1

| Package | | level 1 | level 2 | level 3 | Cardinality | Datatype Name |
|---|---|---|---|---|---|---|
| MaintenanceRequestAllowedIssueGroupAndIssueByElementsQueryMessage_sync 27200 | | MaintenanceRequestAllowedIssueGroupAndIssueByElementsQueryMessage_sync 27202 | | | | MaintenanceRequestAllowedIssueGroupAndIssueByElementsQueryMessage_sync 27204 |
| | Selection 27206 | | MaintenanceRequestAllowedIssueGroupAndIssueSelectionByElements 27208 | | 1 27210 | |
| | | | | MaintenanceRequestTypeCode 27212 | 1 27214 | MaintenanceRequestTypeCode 27216 |

FIG. 272-2

| Package | | level 1 | level 2 | level 3 | Cardinality | Datatype Name |
|---|---|---|---|---|---|---|
| | | | | MaintenanceRequestInstallationPointID 27218 | 0..1 27220 | InstallationPointID 27222 |
| | | | | MaintenanceRequestIndividualMaterialID 27224 | 0..1 27226 | ProductInternalID 27228 |

FIG. 273-1

| Package | | level 1 | level 2 | level 3 | Cardinality | Datatype Name |
|---|---|---|---|---|---|---|
| MaintenanceRequestAllowedIssueGroupAndIssueByElementsResponseMessage_sync 27300 | | MaintenanceRequestAllowedIssueGroupAndIssueByElementsResponseMessage_sync 27302 | | | | MaintenanceRequestAllowedIssueGroupAndIssueByElementsResponseMessage_sync 27304 |
| | MaintenanceRequest 27306 | | MaintenanceRequestAllowedIssueGroupAndIssue 27308 | | 0..n 27310 | |
| | | | | IssueGroupCode 27312 | 1 27314 | MaintenanceRequestIssueGroupCode 27316 |
| | | | | IssueGroupName 27318 | 0..1 27320 | MEDIUM_Name 27322 |

FIG. 273-2

| Package | | level 1 | level 2 | level 3 | Cardinality | Datatype Name |
|---|---|---|---|---|---|---|
| | | | | IssueCode 27324 | 1 27326 | Mainte-nanceReques-tIssueCode 27328 |
| | | | | IssueName 27330 | 0..1 27332 | MEDIUM_Name 27334 |
| | Log 27336 | | Log 27338 | | 1 27340 | Log 27342 |

FIG. 274-1

| Package | | level 1 | level 2 | level 3 | Cardinality | Datatype Name |
|---|---|---|---|---|---|---|
| MaintenanceRequestAllowedProductPartGroupAndProductPartByElementsQueryMessage_sync 27400 | | MaintenanceRequestAllowedProductPartGroupAndProductPartByElementsQueryMessage_sync 27402 | | | | MaintenanceRequestAllowedProductPartGroupAndProductPartByElementsQueryMessage_sync 27404 |
| | Selection 27406 | | MaintenanceRequestAllowedProductPartGroupAndProductPartSelectionByElements 27408 | | 1 27410 | |
| | | | | MaintenanceRequestTypeCode 27412 | 1 27414 | MaintenanceRequestTypeCode 27416 |

FIG. 274-2

| Package | | level 1 | level 2 | level 3 | Cardinality | Datatype Name |
|---|---|---|---|---|---|---|
| | | | | MaintenanceRequestInstallationPointID 27418 | 0..1 27420 | InstallationPointID 27422 |
| | | | | MaintenanceRequestIndividualMaterialID 27424 | 0..1 27426 | ProductInternalID 27428 |

FIG. 275-1

| \Package | | level 1 | level 2 | level 3 | Cardinality | Datatype Name |
|---|---|---|---|---|---|---|
| MaintenanceRequestAllowedProductPartGroupAndProductPartByElementsResponseMessage_sync 27500 | | MaintenanceRequestAllowedProductPartGroupAndProductPartByElementsResponseMessage_sync 27502 | | | | MaintenanceRequestAllowedProductPartGroupAndProductPartByElementsResponseMessage_sync 27504 |
| | MaintenanceRequest 27506 | | MaintenanceRequestAllowedProductPartGroupAndProductPart 27508 | | 0..n 27510 | |
| | | | | ProductPartGroupCode 27512 | 1 27514 | MaintenanceRequest-ProductPartGroupCode 27516 |
| | | | | ProductPartGroupName 27518 | 0..1 27520 | MEDIUM_Name 27522 |
| | | | | ProductPartCode 27524 | 1 27526 | MaintenanceRequest-ProductPartCode 27528 |

FIG. 275-2

| \Package | | level 1 | level 2 | level 3 | Cardinality | Datatype Name |
|---|---|---|---|---|---|---|
| | | | | ProductPart-Name 27530 | 0..1 27532 | MEDIUM_Name 27534 |
| | Log 27536 | | Log 27538 | | 1 27540 | Log 27542 |

FIG. 276-1

| Package | | level 1 | level 2 | level 3 | Cardinality | Datatype Name |
|---|---|---|---|---|---|---|
| MaintenanceRequestAllowedTaskGroupAndTaskByElementsQueryMessage_sync 27600 | | MaintenanceRequestAllowedTaskGroupAndTaskByElementsQueryMessage_sync 27602 | | | | MaintenanceRequestAllowedTaskGroupAndTaskByElementsQueryMessage_sync 27604 |
| | Selection 27606 | | MaintenanceRequestAllowedTaskGroupAndTaskSelectionByElements 27608 | | 1 27610 | |
| | | | | MaintenanceRequestTypeCode 27612 | 1 27614 | MaintenanceRequestTypeCode 27616 |
| | | | | MaintenanceRequestInstallationPointID 27618 | 0..1 27620 | InstallationPointID 27622 |

FIG. 276-2

| Package | level 1 | level 2 | level 3 | Cardinality | Datatype Name |
|---|---|---|---|---|---|
| | | | MaintenanceRequestIndividualMaterialID 27624 | 0..1 27626 | ProductInternalID 27628 |

FIG. 277-1

| Package | level 1 | level 2 | level 3 | Cardinality | Datatype Name |
|---|---|---|---|---|---|
| MaintenanceRequestAllowedTaskGroupAndTaskByElementsResponseMessage_sync 27700 | MaintenanceRequestAllowedTaskGroupAndTaskByElementsResponseMessage_sync 27702 | | | | MaintenanceRequestAllowedTaskGroupAndTaskByElementsResponseMessage_sync 27704 |
| MaintenanceRequest 27706 | | MaintenanceRequestAllowedTaskGroupAndTask 27708 | | 0..n 27710 | |
| | | | TaskGroupCode 27712 | 1 27714 | MaintenanceRequestTaskGroupCode 27716 |
| | | | TaskGroupName 27718 | 0..1 27720 | MEDIUM_Name 27722 |
| | | | TaskCode 27724 | 1 27726 | MaintenanceRequestTaskCode 27728 |

FIG. 277-2

| Package | | level 1 | level 2 | level 3 | Cardinality | Datatype Name |
|---|---|---|---|---|---|---|
| | | | | TaskName 27730 | 0..1 27732 | MEDIUM_Name 27734 |
| | Log 27736 | | Log 27738 | | 1 27740 | Log 27742 |

FIG. 278

| Package | level 1 | level 2 | level 3 | Cardinality | Datatype Name |
|---|---|---|---|---|---|
| MaintenanceRequestBy-IDQueryMessage_sync 27800 | MaintenanceRe-questByIDQue-ryMessage_sync 27802 | | | | MaintenanceRequestByIDQuery-Message_sync 27804 |
| Selection 27806 | | Mainte-nanceRe-questSelec-tionByID 27808 | | 1 27810 | |
| | | | ID 27812 | 1 27814 | MaintenanceRequestID 27816 |

FIG. 279-1

| Package | level 1 | level 2 | level 3 | level 4 | level 5 | Cardinality | Datatype Name |
|---|---|---|---|---|---|---|---|
| MaintenanceRequestByIDResponseMessage_sync 27900 | MaintenanceRequestByIDResponseMessage_sync 27902 | | | | | | MaintenanceRequestByIDResponseMessage_sync 27904 |
| MaintenanceRequest 27906 | | MaintenanceRequest 27908 | | | | 1 27910 | |
| | | | ID 27912 | | | 1 27914 | MaintenanceRequestID 27916 |
| | | | ProjectWorkBreakdownStructureElementID 27918 | | | 0..1 27920 | ProjectWorkBreakdownStructureElementID 27922 |

FIG. 279-2

| Package | level 1 | level 2 | level 3 | level 4 | level 5 | Cardinality | Datatype Name |
|---|---|---|---|---|---|---|---|
| | | | IssueMaintenanceIssueCategoryCatalogueID 27924 | | | 0..1 27926 | MaintenanceIssueCategoryCatalogueID 27928 |
| | | | IssueParentMaintenanceIssueCategoryID 27930 | | | 0..1 27932 | MaintenanceIssueCategoryID 27934 |
| | | | IssueMaintenanceIssueCategoryID 27936 | | | 0..1 27938 | MaintenanceIssueCategoryID 27940 |
| | | | IssueCategoryFilterCode 27942 | | | 0..1 27944 | IssueCategoryFilterCode 27946 |
| | | | MaterialInternalID 27948 | | | 0..1 27950 | ProductInternalID 27952 |

FIG. 279-3

| Package | level 1 | level 2 | level 3 | level 4 | level 5 | Cardinality | Datatype Name |
|---|---|---|---|---|---|---|---|
| | | | Installation-PointID 27954 | | | 0..1 27956 | InstallationPointID 27958 |
| | | | IndividualMa-terialID 27960 | | | 0..1 27962 | ProductInternalD 27964 |
| | | | SerialID 27966 | | | 0..1 27968 | SerialID 27970 |
| | | | Mainte-nancePlantID 27972 | | | 0..1 27974 | PlantID 27976 |
| | | | Mainte-nancePlan-ningPlantID 27978 | | | 0..1 27980 | PlantID 27982 |
| | | | Mainte-nanceWork-CentreID 27984 | | | 0..1 27986 | WorkCentreID 27988 |

FIG. 279-4

| Package | level 1 | level 2 | level 3 | level 4 | level 5 | Cardinality | Datatype Name |
|---|---|---|---|---|---|---|---|
| | | | Mainte-nanceWork-CentrePlan-tID 27990 | | | 0..1 27992 | PlantID 27994 |
| | | | Reporter-InternalID 27996 | | | 0..1 27998 | PartyInternalID 279100 |
| | | | LocationIn-ternalID 279102 | | | 0..1 279104 | LocationInternalID 279106 |
| | | | AffectedIn-stallation-PointID 279108 | | | 0..1 279110 | InstallationPointID 279112 |
| | | | AffectedIndi-vidualMateri-alID 279114 | | | 0..1 279116 | ProductInternalID 279118 |

FIG. 279-5

| Package | level 1 | level 2 | level 3 | level 4 | level 5 | Cardinality | Datatype Name |
|---|---|---|---|---|---|---|---|
| | | | SystemAd-ministrative-Data 279120 | | | 1 279122 | SystemAdministra-tiveData 279124 |
| | | | Reported-DateTime 279126 | | | 0..1 279128 | TIMEZONEINDEPENDENT_DateTime 279130 |
| | | | TypeCode 279132 | | | 1 279134 | MaintenanceRequest-TypeCode 279136 |
| | | | Importance-Code 279138 | | | 0..1 279140 | ImportanceCode 279142 |
| | | | Production-Planner-GroupCode 279144 | | | 0..1 279146 | ProductionPlanner-GroupCode 279148 |
| | | | StatusObject 279150 | | | 1 279152 | StatusObject 279154 |

FIG. 279-6

| Package | level 1 | level 2 | level 3 | level 4 | level 5 | Cardinality | Datatype Name |
|---|---|---|---|---|---|---|---|
| | | | ParentIs-sueMainte-nanceIssue-Category-Name 279156 | | | 0..1 279158 | MEDIUM_Name 279160 |
| | | | IssueMainte-nanceIssue-Category-Name 279162 | | | 0..1 279164 | MEDIUM_Name 279166 |
| | | | MaterialInter-nalDescrip-tion 279168 | | | 0..1 279170 | SHORT_Description 279172 |
| | | | Installation-PointDescrip-tion 279174 | | | 0..1 279176 | SHORT_Description 279178 |

FIG. 279-7

| Package | level 1 | level 2 | level 3 | level 4 | level 5 | Cardinality | Datatype Name |
|---|---|---|---|---|---|---|---|
| | | | IndividualMaterialDescription 279180 | | | 0..1 279182 | SHORT_Description 279184 |
| | | | MaintenancePlantDescription 279186 | | | 0..1 279188 | SHORT_Description 279190 |
| | | | MaintenancePlanningPlantDescription 279192 | | | 0..1 279194 | SHORT_Description 279196 |
| | | | MaintenanceWorkCentreDescription 279198 | | | 0..1 279200 | SHORT_Description 279202 |

FIG. 279-8

| Package | level 1 | level 2 | level 3 | level 4 | level 5 | Cardinality | Datatype Name |
|---|---|---|---|---|---|---|---|
| | | | Requested-Processing-Period 279204 | | | 0..1 279206 | UPPEROPEN_TIMEZONEINDEPENDENT_DateTimePeriod 279208 |
| | | | Machinery-Breakdown-Indicator 279210 | | | 0..1 279212 | Indicator 279214 |
| | | | Machinery-Malfunction-Period 279216 | | | 0..1 279218 | UPPEROPEN_TIMEZONEINDEPENDENT_DateTimePeriod 279220 |
| | | | Machinery-Breakdown-Duration 279222 | | | 0..1 279224 | Duration 279226 |
| | | | LocationDe-scription 279228 | | | 0..1 279230 | SHORT_Description 279232 |

FIG. 279-9

| Package | level 1 | level 2 | level 3 | level 4 | level 5 | Cardinality | Datatype Name |
|---|---|---|---|---|---|---|---|
| | | | TypeName 279234 | | | 0..1 279236 | LEN20_Name 279238 |
| | | | Importance-Name 279240 | | | 0..1 279242 | LEN20_Name 279244 |
| | | | Description 279246 | | | 0..1 279248 | SHORT_Description 279250 |
| | | | DetailedText 279252 | | | 0..1 279254 | Text 279256 |
| | | | AffectedIn-stallation-PointDescrip-tion 279258 | | | 0..1 279260 | SHORT_Description 279262 |
| | | | AffectedIndi-vidualMateri-alDescription 279264 | | | 0..1 279266 | SHORT_Description 279268 |

FIG. 279-10

| Package | level 1 | level 2 | level 3 | level 4 | level 5 | Cardinality | Datatype Name |
|---|---|---|---|---|---|---|---|
| Item 279270 | | | Item 279272 | | | 0..n 279274 | |
| | | | | ID 279276 | | 1 279278 | MaintenanceRequestItemID 279280 |
| | | | | MaterialInternalID 279282 | | 0..1 279284 | ProductInternalID 279286 |
| | | | | DamageMaintenanceIssueCategoryCatalogueID 279288 | | 0..1 279290 | MaintenanceIssueCategoryCatalogueID 279292 |
| | | | | DamageParentMaintenanceIssueCategoryID 279294 | | 0..1 279296 | MaintenanceIssueCategoryID 279298 |

FIG. 279-11

| Package | level 1 | level 2 | level 3 | level 4 | level 5 | Cardinality | Datatype Name |
|---|---|---|---|---|---|---|---|
| | | | | Damage-MaintenanceIssue-CategoryID 279300 | | 0..1 279302 | MaintenanceIssue-CategoryID 279304 |
| | | | | ObjectPart-MaintenanceIssue-Category-CatalogueID 279306 | | 0..1 279308 | MaintenanceIssue-CategoryCatalogueID 279310 |
| | | | | ObjectPart-ParentMaintenanceIssueCategoryID 279312 | | 0..1 279314 | MaintenanceIssue-CategoryID 279316 |
| | | | | ObjectPart-MaintenanceIssue-CategoryID 279318 | | 0..1 279320 | MaintenanceIssue-CategoryID 279322 |

FIG. 279-12

| Package | level 1 | level 2 | level 3 | level 4 | level 5 | Cardinality | Datatype Name |
|---|---|---|---|---|---|---|---|
| | | | | SystemAdministrativeData 279324 | | 1 279326 | SystemAdministrativeData 279328 |
| | | | | MaterialDescription 279330 | | 0..1 279332 | SHORT_Description 279334 |
| | | | | DamageMaintenanceIssueCategoryName 279336 | | 0..1 279338 | MEDIUM_Name 279340 |
| | | | | ParentDamageMaintenanceIssueCategoryName 279342 | | 0..1 279344 | MEDIUM_Name 279346 |

FIG. 279-13

| Package | level 1 | level 2 | level 3 | level 4 | level 5 | Cardinality | Datatype Name |
|---|---|---|---|---|---|---|---|
| | | | | ObjectPart-Mainte-nanceIssue-Category-Name 279348 | | 0..1 279350 | MEDIUM_Name 279352 |
| | | | | ParentOb-jectPartMain-tenanceIs-sueCate-goryName 279354 | | 0..1 279356 | MEDIUM_Name 279358 |
| | | | | Description 279360 | | 0..1 279362 | SHORT_Description 279364 |
| | | | | DetailedText 279366 | | 0..1 279368 | Text 279370 |
| | | | | OrdinalNum-berValue 279372 | | 1 279374 | OrdinalNumberValue 279376 |

FIG. 279-14

| Package | level 1 | level 2 | level 3 | level 4 | level 5 | Cardinality | Datatype Name |
|---|---|---|---|---|---|---|---|
| Cause 279378 | | | | Cause 279380 | | 0..n 279382 | |
| | | | | | ID 279384 | 1 279386 | MaintenanceRe-questCauseID 279388 |
| | | | | | CauseMainte-nanceIssue-CategoryCata-logueID 279390 | 0..1 279392 | MaintenanceIssue-CategoryCatalogueID 279394 |
| | | | | | CauseParent-Mainte-nanceIssue-CategoryID 279396 | 0..1 279398 | MaintenanceIssue-CategoryID 279400 |
| | | | | | CauseMainte-nanceIssue-CategoryID 279402 | 0..1 279404 | MaintenanceIssue-CategoryID 279406 |

FIG. 279-15

| Package | level 1 | level 2 | level 3 | level 4 | level 5 | Cardinality | Datatype Name |
|---|---|---|---|---|---|---|---|
| | | | | | SystemAdministrativeData 279408 | 1 279410 | SystemAdministrativeData 279412 |
| | | | | | ParentMaintenanceIssueCategoryName 279414 | 0..1 279416 | MEDIUM_Name 279418 |
| | | | | | MaintenanceIssueCategoryName 279420 | 0..1 279422 | MEDIUM_Name 279424 |
| | | | | | Description 279426 | 0..1 279428 | SHORT_Description 279430 |
| | | | | | DetailedText 279432 | 0..1 279434 | Text 279436 |
| | | | | | OrdinalNumberValue 279438 | 1 279440 | OrdinalNumberValue 279442 |

FIG. 279-16

| Package | level 1 | level 2 | level 3 | level 4 | level 5 | Cardinality | Datatype Name |
|---|---|---|---|---|---|---|---|
| Task 279444 | | | | Task 279446 | | 0..n 279448 | |
| | | | | | ID 279450 | 1 279452 | MaintenanceRequest-TaskID 279454 |
| | | | | | EmployeeRe-sponsibleInter-nalID 279456 | 0..1 279458 | PartyInternalID 279460 |
| | | | | | Completer-InternalID 279462 | 0..1 279464 | PartyInternalID 279466 |
| | | | | | TaskMainte-nanceIssue-CategoryCata-logueID 279468 | 0..1 279470 | MaintenanceIssue-CategoryCatalogueID 279472 |

FIG. 279-17

| Package | level 1 | level 2 | level 3 | level 4 | level 5 | Cardinality | Datatype Name |
|---|---|---|---|---|---|---|---|
| | | | | | TaskParent-Mainte-nanceIssue-CategoryID 279474 | 0..1 279476 | MaintenanceIssue-CategoryID 279478 |
| | | | | | TaskMainte-nanceIssue-CategoryID 279480 | 0..1 279482 | MaintenanceIssue-CategoryID 279484 |
| | | | | | SystemAdmin-istrativeData 279486 | 1 279488 | SystemAdministra-tiveData 279490 |
| | | | | | EmployeeRe-sponsibleInter-nalTypeCode 279492 | 0..1 279494 | |
| | | | | | StatusObject 279496 | 1 279498 | StatusObject 279500 |

FIG. 279-18

| Package | level 1 | level 2 | level 3 | level 4 | level 5 | Cardinality | Datatype Name |
|---|---|---|---|---|---|---|---|
| | | | | | PlannedProc-essingPeriod 279502 | 0..1 279504 | UPPEROPEN_TIMEZONEINDEPENDENT_DateTimePeriod 279506 |
| | | | | | EmployeeRe-sponsibleFor-mattedName 279508 | 0..1 279510 | LONG_Name 279512 |
| | | | | | PartyCom-pleterInternal-Name 279514 | 0..1 279516 | LONG_Name 279518 |
| | | | | | Completed-DateTime 279520 | 0..1 279522 | TIMEZONEINDEPENDENT_DateTime 279524 |
| | | | | | ParentTask-Mainte-nanceIssue-CategoryName 279526 | 0..1 279528 | MEDIUM_Name 279530 |

FIG. 279-19

| Package | level 1 | level 2 | level 3 | level 4 | level 5 | Cardinality | Datatype Name |
|---|---|---|---|---|---|---|---|
| | | | | | TaskMainte-nanceIssue-CategoryName 279532 | 0..1 279534 | MEDIUM_Name 279536 |
| | | | | | Description 279538 | 0..1 279540 | SHORT_Description 279542 |
| | | | | | DetailedText 279544 | 0..1 279546 | Text 279548 |
| | | | | | OrdinalNum-berValue 279550 | 1 279552 | OrdinalNumberValue 279554 |
| Activitiy 279556 | | | | Activitiy 279558 | | 0..n 279560 | |
| | | | | | ID 279562 | 1 279564 | MaintenanceRe-questActivityID 279566 |

FIG. 279-20

| Package | level 1 | level 2 | level 3 | level 4 | level 5 | Cardinality | Datatype Name |
|---|---|---|---|---|---|---|---|
| | | | | | ActivityMaintenanceIssueCategoryCatalogueID 279568 | 0..1 279570 | MaintenanceIssueCategoryCatalogueID 279572 |
| | | | | | ActivityParentMaintenanceIssueCategoryID 279574 | 0..1 279576 | MaintenanceIssueCategoryID 279578 |
| | | | | | ActivityMaintenanceIssueCategoryID 279580 | 0..1 279582 | MaintenanceIssueCategoryID 279584 |
| | | | | | SystemAdministrativeData 279586 | 1 279588 | SystemAdministrativeData 279590 |
| | | | | | ProcessingPeriod 279592 | 0..1 279594 | UPPEROPEN_TIMEZONEINDEPENDENT_DateTimePeriod 279596 |

FIG. 279-21

| Package | level 1 | level 2 | level 3 | level 4 | level 5 | Cardinality | Datatype Name |
|---|---|---|---|---|---|---|---|
| | | | | | ParentMainte-nanceIssue-CategoryName 279598 | 0..1 279600 | MEDIUM_Name 279602 |
| | | | | | Mainte-nanceIssue-CategoryName 279604 | 0..1 279606 | MEDIUM_Name 279608 |
| | | | | | Description 279610 | 0..1 279612 | SHORT_Description 279614 |
| | | | | | DetailedText 279616 | 0..1 279618 | Text 279620 |
| | | | | | OrdinalNum-berValue 279622 | 1 279624 | OrdinalNumberValue 279626 |
| Task 279628 | | | Task 279630 | | | 0..n 279632 | |

FIG. 279-22

| Package | level 1 | level 2 | level 3 | level 4 | level 5 | Cardinality | Datatype Name |
|---|---|---|---|---|---|---|---|
| | | | | ID 279634 | | 1 279636 | MaintenanceRequest-TaskID 279638 |
| | | | | EmployeeR-esponsibleIn-ternalID 279640 | | 0..1 279642 | PartyInternalID 279644 |
| | | | | Completer-InternalID 279646 | | 0..1 279648 | PartyInternalID 279650 |
| | | | | TaskMainte-nanceIssue-Category-CatalogueID 279652 | | 0..1 279654 | MaintenanceIssue-CategoryCatalogueID 279656 |
| | | | | TaskParent-Mainte-nanceIssue-CategoryID 279658 | | 0..1 279660 | MaintenanceIssue-CategoryID 279662 |

FIG. 279-23

| Package | level 1 | level 2 | level 3 | level 4 | level 5 | Cardinality | Datatype Name |
|---|---|---|---|---|---|---|---|
| | | | | TaskMaintenanceIssue-CategoryID 279664 | | 0..1 279666 | MaintenanceIssue-CategoryID 279668 |
| | | | | SystemAd-ministrative-Data 279670 | | 1 279672 | SystemAdministra-tiveData 279674 |
| | | | | EmployeeR-esponsibleIn-ternalType-Code 279676 | | 0..1 279678 | |
| | | | | StatusObject 279680 | | 1 279682 | StatusObject 279684 |
| | | | | Planned-Processing-Period 279686 | | 0..1 279688 | UPPEROPEN_TIMEZONEINDEPENDENT_DateTimePeriod 279690 |

FIG. 279-24

| Package | level 1 | level 2 | level 3 | level 4 | level 5 | Cardinality | Datatype Name |
|---|---|---|---|---|---|---|---|
| | | | | EmployeeR-esponsible-Formatted-Name 279692 | | 0..1 279694 | LONG_Name 279696 |
| | | | | PartyCom-pleterInter-nalName 279698 | | 0..1 279700 | LONG_Name 279702 |
| | | | | Completed-DateTime 279704 | | 0..1 279706 | TIMEZONEINDEPEN DENT_DateTime 279708 |
| | | | | ParentTask-Mainte-nanceIssue-Category-Name 279710 | | 0..1 279712 | MEDIUM_Name 279714 |

FIG. 279-25

| Package | level 1 | level 2 | level 3 | level 4 | level 5 | Cardinality | Datatype Name |
|---|---|---|---|---|---|---|---|
| | | | | TaskMainte-nanceIssue-Category-Name 279716 | | 0..1 279718 | MEDIUM_Name 279720 |
| | | | | Description 279722 | | 0..1 279724 | SHORT_Description 279726 |
| | | | | DetailedText 279728 | | 0..1 279730 | Text 279732 |
| | | | | OrdinalNum-berValue 279734 | | 1 279736 | OrdinalNumberValue 279738 |
| Activity 279740 | | | Activitiy 279742 | | | 0..n 279744 | |
| | | | | ID 279746 | | 1 279748 | MaintenanceRe-questActivityID 279750 |

FIG. 279-26

| Package | level 1 | level 2 | level 3 | level 4 | level 5 | Cardinality | Datatype Name |
|---|---|---|---|---|---|---|---|
| | | | | ActivityMaintenanceIssueCategoryCatalogueID 279752 | | 0..1 279754 | MaintenanceIssueCategoryCatalogueID 279756 |
| | | | | ActivityParentMaintenanceIssueCategoryID 279758 | | 0..1 279760 | MaintenanceIssueCategoryID 279762 |
| | | | | ActivityMaintenanceIssueCategoryID 279764 | | 0..1 279766 | MaintenanceIssueCategoryID 279768 |
| | | | | SystemAdministrativeData 279770 | | 1 279772 | SystemAdministrativeData 279774 |

FIG. 279-27

| Package | level 1 | level 2 | level 3 | level 4 | level 5 | Cardinality | Datatype Name |
|---|---|---|---|---|---|---|---|
| | | | | Processing-Period 279776 | | 0..1 279778 | UPPEROPEN_TIMEZONEINDEPENDENT_DateTimePeriod 279780 |
| | | | | ParentMaintenanceIssueCategoryName 279782 | | 0..1 279784 | MEDIUM_Name 279786 |
| | | | | MaintenanceIssue-Category-Name 279788 | | 0..1 279790 | MEDIUM_Name 279792 |
| | | | | Description 279794 | | 0..1 279796 | SHORT_Description 279798 |
| | | | | DetailedText 279800 | | 0..1 279802 | Text 279804 |

FIG. 279-28

| Package | level 1 | level 2 | level 3 | level 4 | level 5 | Cardinality | Datatype Name |
|---|---|---|---|---|---|---|---|
| | | | | OrdinalNum-berValue 279806 | | 1 279808 | OrdinalNumberValue 279810 |

FIG. 280-1

| Package | level 1 | level 2 | level 3 | level 4 | level 5 | Cardinality | Datatype Name |
|---|---|---|---|---|---|---|---|
| MaintenanceRequest-ChangeCheckQueryMessage_sync 28000 | MaintenanceRequest-ChangeCheckQuery-Message_sync 28002 | | | | | | MaintenanceRequest-ChangeCheckQueryMessage_sync 28004 |
| MaintenanceRequest 28006 | | MaintenanceRequest 28008 | | | | 1 28010 | |
| | | | ID 28012 | | | 1 28014 | MaintenanceRequestID 28016 |
| | | | ProjectWork-Breakdown-StructureElementID 28018 | | | 0..1 28020 | ProjectWork-Breakdown-StructureElementID 28022 |

FIG. 280-2

| Package | | level 1 | level 2 | level 3 | level 4 | level 5 | Cardinality | Datatype Name |
|---|---|---|---|---|---|---|---|---|
| | | | | IssueMaintenanceIssueCategoryCatalogueID 28024 | | | 0..1 28026 | MaintenanceIssueCategoryCatalogueID 28028 |
| | | | | IssueParentMaintenanceIssueCategoryID 28030 | | | 0..1 28032 | MaintenanceIssueCategoryID 28034 |
| | | | | IssueMaintenanceIssueCategoryID 28036 | | | 0..1 28038 | MaintenanceIssueCategoryID 28040 |
| | | | | MaterialInternalID 28042 | | | 0..1 28044 | ProductInternalID 28046 |
| | | | | InstallationPointID 28048 | | | 0..1 28050 | InstallationPointID 28052 |

FIG. 280-3

| Package | | level 1 | level 2 | level 3 | level 4 | level 5 | Cardinality | Datatype Name |
|---|---|---|---|---|---|---|---|---|
| | | | | IndividualMa-terialID 28054 | | | 0..1 28056 | ProductInter-nalD 28058 |
| | | | | SerialID 28060 | | | 0..1 28062 | SerialID 28064 |
| | | | | Mainte-nancePlantID 28066 | | | 0..1 28068 | PlantID 28070 |
| | | | | Mainte-nancePlan-ningPlantID 28072 | | | 0..1 28074 | PlantID 28076 |
| | | | | Mainte-nanceWork-CentreID 28078 | | | 0..1 28080 | WorkCentreID 28082 |

FIG. 280-4

| Package | level 1 | level 2 | level 3 | level 4 | level 5 | Cardinality | Datatype Name |
|---|---|---|---|---|---|---|---|
| | | | MaintenanceWorkCentrePlantID 28084 | | | 0..1 28086 | PlantID 28088 |
| | | | ReporterInternalID 28090 | | | 0..1 28092 | PartyInternalID 28094 |
| | | | LocationInternalID 28096 | | | 0..1 28098 | LocationInternalID 280100 |
| | | | AffectedInstallationPointID 280102 | | | 0..1 280104 | InstallationPointID 280106 |
| | | | AffectedIndividualMaterialID 280108 | | | 0..1 280110 | ProductInternalID 280112 |

FIG. 280-5

| Package | level 1 | level 2 | level 3 | level 4 | level 5 | Cardinality | Datatype Name |
|---|---|---|---|---|---|---|---|
| | | | Reported-DateTime 280114 | | | 0..1 280116 | TIMEZONEINDEPENDENT_DateTime 280118 |
| | | | Importance-Code 280120 | | | 0..1 280122 | Importance-Code 280124 |
| | | | Production-Planner-GroupCode 280126 | | | 0..1 280128 | Production-PlannerGroup-Code 280130 |
| | | | Requested-Processing-Period 280132 | | | 0..1 280134 | UPPEROPEN_TIMEZONEINDEPENDENT_DateTimePeriod 280136 |
| | | | Machinery-Breakdown-Indicator 280138 | | | 0..1 280140 | Indicator 280142 |

FIG. 280-6

| Package | level 1 | level 2 | level 3 | level 4 | level 5 | Cardinality | Datatype Name |
|---|---|---|---|---|---|---|---|
| | | | Machinery-Malfunction-Period 280144 | | | 0..1 280146 | UPPEROPEN_TIMEZONEINDEPENDENT_DateTimePeriod 280148 |
| | | | Machinery-Breakdown-Duration 280150 | | | 0..1 280152 | Duration 280154 |
| | | | Description 280156 | | | 0..1 280158 | SHORT_Description 280160 |
| | | | DetailedText 280162 | | | 0..1 280164 | Text 280166 |
| Item 280168 | | | Item 280170 | | | 0..n 280172 | |
| | | | | ID 280174 | | 1 280176 | Mainte-nanceReques-tItemID 280178 |

FIG. 280-7

| Package | | | level 1 | level 2 | level 3 | level 4 | level 5 | Cardinality | Datatype Name |
|---|---|---|---|---|---|---|---|---|---|
| | | | | | | MaterialInter-nalID 280180 | | 0..1 280182 | ProductInter-nalID 280184 |
| | | | | | | Damage-Mainte-nanceIssue-Category-CatalogueID 280186 | | 0..1 280188 | MaintenanceIs-sueCategory-CatalogueID 280190 |
| | | | | | | DamagePar-entMainte-nanceIssue-CategoryID 280192 | | 0..1 280194 | MaintenanceIs-sueCategoryID 280196 |
| | | | | | | Damage-Mainte-nanceIssue-CategoryID 280198 | | 0..1 280200 | MaintenanceIs-sueCategoryID 280202 |

FIG. 280-8

| Package | level 1 | level 2 | level 3 | level 4 | level 5 | Cardinality | Datatype Name |
|---|---|---|---|---|---|---|---|
| | | | | ObjectPart-MaintenanceIssue-Category-CatalogueID 280204 | | 0..1 280206 | MaintenanceIssueCategory-CatalogueID 280208 |
| | | | | ObjectPart-ParentMaintenanceIssueCategoryID 280210 | | 0..1 280212 | MaintenanceIssueCategoryID 280214 |
| | | | | ObjectPart-MaintenanceIssue-CategoryID 280216 | | 0..1 280218 | MaintenanceIssueCategoryID 280220 |
| | | | | Description 280222 | | 0..1 280224 | SHORT_Description 280226 |

FIG. 280-9

| Package | level 1 | level 2 | level 3 | level 4 | level 5 | Cardinality | Datatype Name |
|---|---|---|---|---|---|---|---|
| | | | | DetailedText 280228 | | 0..1 280230 | Text 280232 |
| | | | | OrdinalNumberValue 280234 | | 1 280236 | OrdinalNumberValue 280238 |
| | | | | @actionCode 280240 | | 1 280242 | ActionCode 280244 |
| Cause 280246 | | | | Cause 280248 | | 0..n 280250 | |
| | | | | | ID 280252 | 1 280254 | MaintenanceRequestCauseID 280256 |
| | | | | | CauseMaintenanceIssueCategoryCatalogueID 280258 | 0..1 280260 | MaintenanceIssueCategoryCatalogueID 280262 |

FIG. 280-10

| Package | level 1 | level 2 | level 3 | level 4 | level 5 | Cardinality | Datatype Name |
|---|---|---|---|---|---|---|---|
| | | | | | CauseParentMaintenanceIssueCategoryID 280264 | 0..1 280266 | MaintenanceIssueCategoryID 280268 |
| | | | | | CauseMaintenanceIssueCategoryID 280270 | 0..1 280272 | MaintenanceIssueCategoryID 280274 |
| | | | | | Description 280276 | 0..1 280278 | SHORT_Description 280280 |
| | | | | | DetailedText 280282 | 0..1 280284 | Text 280286 |
| | | | | | OrdinalNumberValue 280288 | 1 280290 | OrdinalNumberValue 280292 |

FIG. 280-11

| Package | level 1 | level 2 | level 3 | level 4 | level 5 | Cardinality | Datatype Name |
|---|---|---|---|---|---|---|---|
| | | | | | @actionCode 280294 | 1 280296 | ActionCode 280298 |
| Task 280300 | | | | Task 280302 | | 0..n 280304 | |
| | | | | | ID 280306 | 1 280308 | Mainte-nanceRequest-TaskID 280310 |
| | | | | | EmployeeR-esponsi-bleInternalID 280312 | 0..1 280314 | PartyInternalID 280316 |
| | | | | | Completer-InternalID 280318 | 0..1 280320 | PartyInternalID 280322 |

FIG. 280-12

| Package | level 1 | level 2 | level 3 | level 4 | level 5 | Cardinality | Datatype Name |
|---|---|---|---|---|---|---|---|
| | | | | | TaskMaintenanceIssueCategoryCatalogueID 280324 | 0..1 280326 | MaintenanceIssueCategoryCatalogueID 280328 |
| | | | | | TaskParentMaintenanceIssueCategoryID 280330 | 0..1 280332 | MaintenanceIssueCategoryID 280334 |
| | | | | | TaskMaintenanceIssueCategoryID 280336 | 0..1 280338 | MaintenanceIssueCategoryID 280340 |

FIG. 280-13

| Package | | | | level 1 | level 2 | level 3 | level 4 | level 5 | Cardinality | Datatype Name |
|---|---|---|---|---|---|---|---|---|---|---|
| | | | | | | | | EmployeeR-esponsi-bleInter-nalType-Code 280342 | 0..1 280344 | BusinessOb-jectTypeCode 280346 |
| | | | | | | | | Planned-Processing-Period 280348 | 0..1 280350 | UPPEROPEN_TIMEZONEINDEPENDENT_DateTimePeriod 280352 |
| | | | | | | | | Description 280354 | 0..1 280356 | SHORT_Description 280358 |
| | | | | | | | | DetailedText 280360 | 0..1 280362 | Text 280364 |
| | | | | | | | | Ordinal-Number-Value 280366 | 1 280368 | OrdinalNum-berValue 280370 |

FIG. 280-14

| Package | level 1 | level 2 | level 3 | level 4 | level 5 | Cardinality | Datatype Name |
|---|---|---|---|---|---|---|---|
| | | | | | @actionCode 280372 | 1 280374 | ActionCode 280376 |
| Activitiy 280378 | | | | Activitiy 280380 | | 0..n 280382 | |
| | | | | | ID 280384 | 1 280386 | MaintenanceRequestActivityID 280388 |
| | | | | | ActivityMaintenanceIssueCategoryCatalogueID 280390 | 0..1 280392 | MaintenanceIssueCategoryCatalogueID 280394 |
| | | | | | ActivityParentMaintenanceIssueCategoryID 280396 | 0..1 280398 | MaintenanceIssueCategoryID 280400 |

FIG. 280-15

| Package | level 1 | level 2 | level 3 | level 4 | level 5 | Cardinality | Datatype Name |
|---|---|---|---|---|---|---|---|
| | | | | | ActivityMain-tenanceIs-sueCate-goryID 280402 | 0..1 280404 | MaintenanceIs-sueCategoryID 280406 |
| | | | | | Processing-Period 280408 | 0..1 280410 | UPPEROPEN_TIMEZONEINDEPENDENT_DateTimePeriod 280412 |
| | | | | | Description 280414 | 0..1 280416 | SHORT_Description 280418 |
| | | | | | DetailedText 280420 | 0..1 280422 | Text 280424 |
| | | | | | Ordinal-Number-Value 280426 | 1 280428 | OrdinalNum-berValue 280430 |

FIG. 280-16

| Package | level 1 | level 2 | level 3 | level 4 | level 5 | Cardinality | Datatype Name |
|---|---|---|---|---|---|---|---|
| | | | | | @actionCode 280432 | 1 280434 | ActionCode 280436 |
| Task 280438 | | | Task 280440 | | | 0..n 280442 | |
| | | | | ID 280444 | | 1 280446 | Mainte-nanceRequest-TaskID 280448 |
| | | | | EmployeeR-esponsibleIn-ternalID 280450 | | 0..1 280452 | PartyInternalID 280454 |
| | | | | Completer-InternalID 280456 | | 0..1 280458 | PartyInternalID 280460 |

FIG. 280-17

| Package | | | level 1 | level 2 | level 3 | level 4 | level 5 | Cardinality | Datatype Name |
|---|---|---|---|---|---|---|---|---|---|
| | | | | | | TaskMaintenanceIssue-Category-CatalogueID 280462 | | 0..1 280464 | MaintenanceIssueCategory-CatalogueID 280466 |
| | | | | | | TaskParent-MaintenanceIssue-CategoryID 280468 | | 0..1 280470 | MaintenanceIssueCategoryID 280472 |
| | | | | | | TaskMaintenanceIssue-CategoryID 280474 | | 0..1 280476 | MaintenanceIssueCategoryID 280478 |
| | | | | | | EmployeeResponsibleInternalType-Code 280480 | | 0..1 280482 | |

FIG. 280-18

| Package | level 1 | level 2 | level 3 | level 4 | level 5 | Cardinality | Datatype Name |
|---|---|---|---|---|---|---|---|
| | | | | Planned-Processing-Period 280484 | | 0..1 280486 | UPPEROPEN_TIMEZONEINDEPENDENT_DateTimePeriod 280488 |
| | | | | Description 280490 | | 0..1 280492 | SHORT_Description 280494 |
| | | | | DetailedText 280496 | | 0..1 280498 | Text 280500 |
| | | | | OrdinalNum-berValue 280502 | | 1 280504 | OrdinalNum-berValue 280506 |
| | | | | @actionCode 280508 | | 1 280510 | ActionCode 280512 |
| Activity 280514 | | | Activitiy 280516 | | | 0..n 280518 | |

FIG. 280-19

| Package | level 1 | level 2 | level 3 | level 4 | level 5 | Cardinality | Datatype Name |
|---|---|---|---|---|---|---|---|
| | | | | ID 280520 | | 1 280522 | MaintenanceRequestActivityID 280524 |
| | | | | ActivityMaintenanceIssueCategoryCatalogueID 280526 | | 0..1 280528 | MaintenanceIssueCategoryCatalogueID 280530 |
| | | | | ActivityParentMaintenanceIssueCategoryID 280532 | | 0..1 280534 | MaintenanceIssueCategoryID 280536 |
| | | | | ActivityMaintenanceIssueCategoryID 280538 | | 0..1 280540 | MaintenanceIssueCategoryID 280542 |

FIG. 280-20

| Package | level 1 | level 2 | level 3 | level 4 | level 5 | Cardinality | Datatype Name |
|---|---|---|---|---|---|---|---|
| | | | | Processing-Period 280544 | | 0..1 280546 | UPPEROPEN_TIMEZONEINDEPENDENT_DateTimePeriod 280548 |
| | | | | Description 280550 | | 0..1 280552 | SHORT_Description 280554 |
| | | | | DetailedText 280556 | | 0..1 280558 | Text 280560 |
| | | | | OrdinalNum-berValue 280562 | | 1 280564 | OrdinalNum-berValue 280566 |
| | | | | @actionCode 280568 | | 1 280570 | ActionCode 280572 |

FIG. 281

| Package | level 1 | level 2 | Cardinality | Datatype Name |
|---|---|---|---|---|
| MaintenanceRequest-ChangeCheckResponse-Message_sync 28100 | MaintenanceRequest-ChangeCheckResponse-Message_sync 28102 | | | MaintenanceRequest-ChangeCheckResponse-Message_sync 28104 |
| Log 28106 | | Log 28108 | 1 28110 | Log 28112 |

FIG. 282

| Package | level 1 | level 2 | level 3 | Cardinality | Datatype Name |
|---|---|---|---|---|---|
| MaintenanceRequest-ChangeConfirmationMes-sage_sync 28200 | MaintenanceRe-questChangeCon-firmationMes-sage_sync 28202 | | | | MaintenanceRe-questChangeConfir-mationMessage_sync 28204 |
| MessageHeader 28206 | | Message-Header 28208 | | 0..1 28210 | BasicBusinessDocu-mentMessageHeader 28212 |
| MaintenanceRequest 28214 | | Mainte-nanceRe-quest 28216 | | 0..1 28218 | |
| | | | ID 28220 | 1 28222 | MaintenanceReques-tID 28224 |
| Log 28226 | | Log 28228 | | 1 28230 | Log C |

FIG. 283-1

| Package | level 1 | level 2 | level 3 | level 4 | level 5 | Cardinality | Datatype Name |
|---|---|---|---|---|---|---|---|
| MaintenanceRequestChangeRequestMessage_sync 28300 | MaintenanceRequestChangeRequestMessage_sync 28302 | | | | | | MaintenanceRequestChangeRequestMessage_sync 28304 |
| MessageHeader 28306 | | MessageHeader 28308 | | | | 0..1 28310 | BasicBusinessDocumentMessageHeader 28312 |
| MaintenanceRequest 28314 | | MaintenanceRequest 28316 | | | | 1 28318 | |
| | | | ID 28320 | | | 1 28322 | MaintenanceRequestID 28324 |

FIG. 283-2

| Package | level 1 | level 2 | level 3 | level 4 | level 5 | Cardinality | Datatype Name |
|---|---|---|---|---|---|---|---|
| | | | Project-WorkBreakdown-Structu-reElemen-tID 28326 | | | 0..1 28328 | ProjectWorkBreak-downStructureEle-mentID 28330 |
| | | | IssueMain-tenanceIs-sueCate-goryCata-logueID 28332 | | | 0..1 28334 | MaintenanceIssue-CategoryCatalogueID 28336 |
| | | | IssuePar-entMainte-nanceIs-sueCate-goryID 28338 | | | 0..1 28340 | MaintenanceIssue-CategoryID 28342 |

FIG. 283-3

| Package | | level 1 | level 2 | level 3 | level 4 | level 5 | Cardinality | Datatype Name |
|---|---|---|---|---|---|---|---|---|
| | | | | IssueMain-tenanceIs-sueCate-goryID 28344 | | | 0..1 28346 | MaintenanceIssue-CategoryID 28348 |
| | | | | MaterialIn-ternalID 28350 | | | 0..1 28352 | ProductInternalID 28354 |
| | | | | Installa-tionPointID 28356 | | | 0..1 28358 | InstallationPointID 28360 |
| | | | | Individu-alMateri-alID 28362 | | | 0..1 28364 | ProductInternalD 28366 |
| | | | | SerialID 28368 | | | 0..1 28370 | SerialID 28372 |

FIG. 283-4

| Package | | level 1 | level 2 | level 3 | level 4 | level 5 | Cardinality | Datatype Name |
|---|---|---|---|---|---|---|---|---|
| | | | | Mainte-nance-PlantID 28374 | | | 0..1 28376 | PlantID 28378 |
| | | | | Mainte-nance-Planning-PlantID 28380 | | | 0..1 28382 | PlantID 28384 |
| | | | | Mainte-nance-WorkCen-treID 28386 | | | 0..1 28388 | WorkCentreID 28390 |
| | | | | Mainte-nance-WorkCen-trePlantID 28392 | | | 0..1 28394 | PlantID 28396 |

FIG. 283-5

| Package | level 1 | level 2 | level 3 | level 4 | level 5 | Cardinality | Datatype Name |
|---|---|---|---|---|---|---|---|
| | | | Reporter-InternalID 28398 | | | 0..1 283100 | PartyInternalID 283102 |
| | | | LocationIn-ternalID 283104 | | | 0..1 283106 | LocationInternalID 283108 |
| | | | AffectedIn-stallation-PointID 283110 | | | 0..1 283112 | InstallationPointID 283114 |
| | | | Affect-edIndi-vidualMa-terialID 283116 | | | 0..1 283118 | ProductInternalD 283120 |
| | | | Reported-DateTime 283122 | | | 0..1 283124 | TIMEZONEINDEPENDENT_DateTime 283126 |

FIG. 283-6

| Package | level 1 | level 2 | level 3 | level 4 | level 5 | Cardinality | Datatype Name |
|---|---|---|---|---|---|---|---|
| | | | Impor-tanceCode 283128 | | | 0..1 283130 | ImportanceCode 283132 |
| | | | Produc-tionPlan-nerGroup-Code 283134 | | | 0..1 283136 | ProductionPlanner-GroupCode 283138 |
| | | | Request-edProc-essingPe-riod 283140 | | | 0..1 283142 | UPPEROPEN_TIMEZONEINDEPENDENT_DateTimePeriod 283144 |
| | | | Machin-eryBreak-downIndi-cator 283146 | | | 0..1 283148 | Indicator 283150 |

FIG. 283-7

| Package | level 1 | level 2 | level 3 | level 4 | level 5 | Cardinality | Datatype Name |
|---|---|---|---|---|---|---|---|
| | | | Machin-eryMal-function-Period 283152 | | | 0..1 283154 | UPPEROPEN_TIMEZONEINDEPENDENT_DateTimePeriod 283156 |
| | | | Machin-eryBreak-downDura-tion 283158 | | | 0..1 283160 | Duration 283162 |
| | | | Description 283164 | | | 0..1 283166 | SHORT_Description 283168 |
| | | | Detailed-Text 283170 | | | 0..1 283172 | Text 283174 |
| Item 283176 | | | Item 283178 | | | 0..n 283180 | |
| | | | | ID 283182 | | 1 283184 | MaintenanceReques-tItemID 283186 |

FIG. 283-8

| Package | | | level 1 | level 2 | level 3 | level 4 | level 5 | Cardinality | Datatype Name |
|---|---|---|---|---|---|---|---|---|---|
| | | | | | | MaterialIn-ternalID 283188 | | 0..1 283190 | ProductInternalID 283192 |
| | | | | | | Damage-Mainte-nanceIs-sueCate-goryCata-logueID 283194 | | 0..1 283196 | MaintenanceIssue-CategoryCatalogueID 283198 |
| | | | | | | DamageParentMainte-nanceIs-sueCate-goryID 283200 | | 0..1 283202 | MaintenanceIssue-CategoryID 283204 |
| | | | | | | Damage-Mainte-nanceIs-sueCate-goryID 283206 | | 0..1 283208 | MaintenanceIssue-CategoryID 283210 |

FIG. 283-9

| Package | level 1 | level 2 | level 3 | level 4 | level 5 | Cardinality | Datatype Name |
|---|---|---|---|---|---|---|---|
| | | | | ObjectPartMaintenanceIssueCategoryCatalogueID 283212 | | 0..1 283214 | MaintenanceIssueCategoryCatalogueID 283216 |
| | | | | ObjectPartParentMaintenanceIssueCategoryID 283218 | | 0..1 283220 | MaintenanceIssueCategoryID 283222 |
| | | | | ObjectPartMaintenanceIssueCategoryID 283224 | | 0..1 283226 | MaintenanceIssueCategoryID 283228 |
| | | | | Description 283230 | | 0..1 283232 | SHORT_Description 283234 |

FIG. 283-10

| Package | level 1 | level 2 | level 3 | level 4 | level 5 | Cardinality | Datatype Name |
|---|---|---|---|---|---|---|---|
| | | | | Detailed-Text 283236 | | 0..1 283238 | Text 283240 |
| | | | | Ordinal-Number-Value 283242 | | 1 283244 | OrdinalNumberValue 283246 |
| | | | | @actionCode 283248 | | 1 283250 | ActionCode 283252 |
| Cause 283254 | | | | Cause 283256 | | 0..n 283258 | |
| | | | | | ID 283260 | 1 283262 | MaintenanceRequestCauseID 283264 |
| | | | | | CauseMaintenanceIssue-CategoryCatalogueID 283266 | 0..1 283268 | MaintenanceIssue-CategoryCatalogueID 283270 |

FIG. 283-11

| Package | level 1 | level 2 | level 3 | level 4 | level 5 | Cardinality | Datatype Name |
|---|---|---|---|---|---|---|---|
| | | | | | CauseParent-Mainte-nanceIssue-CategoryID 283272 | 0..1 283274 | MaintenanceIssue-CategoryID 283276 |
| | | | | | CauseMainte-nanceIssue-CategoryID 283278 | 0..1 283280 | MaintenanceIssue-CategoryID 283282 |
| | | | | | Description 283284 | 0..1 283286 | SHORT_Description 283288 |
| | | | | | DetailedText 283290 | 0..1 283292 | Text 283294 |
| | | | | | OrdinalNum-berValue 283296 | 1 283298 | OrdinalNumberValue 283300 |
| | | | | | @actionCode 283302 | 1 283304 | ActionCode 283306 |

FIG. 283-12

| Package | level 1 | level 2 | level 3 | level 4 | level 5 | Cardinality | Datatype Name |
|---|---|---|---|---|---|---|---|
| Task 283308 | | | | Task 283310 | | 0..n 283312 | |
| | | | | | ID 283314 | 1 283316 | MaintenanceRequestTaskID 283318 |
| | | | | | EmployeeResponsibleInternalID 283320 | 0..1 283322 | PartyInternalID 283324 |
| | | | | | CompleterInternalID 283326 | 0..1 283328 | PartyInternalID 283330 |
| | | | | | TaskMaintenanceIssueCategoryCatalogueID 283332 | 0..1 283334 | MaintenanceIssueCategoryCatalogueID 283336 |

FIG. 283-13

| Package | level 1 | level 2 | level 3 | level 4 | level 5 | Cardinality | Datatype Name |
|---|---|---|---|---|---|---|---|
| | | | | | TaskParent-Mainte-nanceIssue-CategoryID 283338 | 0..1 283340 | MaintenanceIssue-CategoryID 283342 |
| | | | | | TaskMainte-nanceIssue-CategoryID 283344 | 0..1 283346 | MaintenanceIssue-CategoryID 283348 |
| | | | | | EmployeeRe-sponsibleInter-nalTypeCode 283350 | 0..1 283352 | |
| | | | | | PlannedProc-essingPeriod 283354 | 0..1 283356 | UPPEROPEN_TIMEZONEINDEPENDENT_DateTimePeriod 283358 |
| | | | | | Description 283360 | 0..1 283362 | SHORT_Description 283364 |

FIG. 283-14

| Package | level 1 | level 2 | level 3 | level 4 | level 5 | Cardinality | Datatype Name |
|---|---|---|---|---|---|---|---|
| | | | | | DetailedText 283366 | 0..1 283368 | Text 283370 |
| | | | | | OrdinalNumberValue 283372 | 1 283374 | OrdinalNumberValue 283376 |
| | | | | | @actionCode 283378 | 1 283380 | ActionCode 283382 |
| Activitiy 283384 | | | | Activitiy 283386 | | 0..n 283388 | |
| | | | | | ID 283390 | 1 283392 | MaintenanceRequestActivityID 283394 |
| | | | | | ActivityMaintenanceIssueCategoryCatalogueID 283396 | 0..1 283398 | MaintenanceIssueCategoryCatalogueID 283400 |

FIG. 283-15

| Package | level 1 | level 2 | level 3 | level 4 | level 5 | Cardinality | Datatype Name |
|---|---|---|---|---|---|---|---|
| | | | | | ActivityParentMaintenanceIssueCategoryID 283402 | 0..1 283404 | MaintenanceIssueCategoryID 283406 |
| | | | | | ActivityMaintenanceIssueCategoryID 283408 | 0..1 283410 | MaintenanceIssueCategoryID 283412 |
| | | | | | ProcessingPeriod 283414 | 0..1 283416 | UPPEROPEN_TIMEZONEINDEPENDENT_DateTimePeriod 283418 |
| | | | | | Description 283420 | 0..1 283422 | SHORT_Description 283424 |
| | | | | | DetailedText 283426 | 0..1 283428 | Text 283430 |
| | | | | | OrdinalNumberValue 283432 | 1 283434 | OrdinalNumberValue 283436 |

FIG. 283-16

| Package | level 1 | level 2 | level 3 | level 4 | level 5 | Cardinality | Datatype Name |
|---|---|---|---|---|---|---|---|
| | | | | | @actionCode 283438 | 1 283440 | ActionCode 283442 |
| Task 283444 | | | Task 283446 | | | 0..n 283448 | |
| | | | | ID 283450 | | 1 283452 | MaintenanceRequestTaskID 283454 |
| | | | | EmployeeResponsibleInternalID 283456 | | 0..1 283458 | PartyInternalID 283460 |
| | | | | CompleterInternalID 283462 | | 0..1 283464 | PartyInternalID 283466 |

FIG. 283-17

| Package | level 1 | level 2 | level 3 | level 4 | level 5 | Cardinality | Datatype Name |
|---|---|---|---|---|---|---|---|
| | | | | TaskMaintenanceIssueCategoryCatalogueID 283468 | | 0..1 283470 | MaintenanceIssue-CategoryCatalogueID 283472 |
| | | | | TaskParentMaintenanceIssueCategoryID 283474 | | 0..1 283476 | MaintenanceIssue-CategoryID 283478 |
| | | | | TaskMaintenanceIssueCategoryID 283480 | | 0..1 283482 | MaintenanceIssue-CategoryID 283484 |
| | | | | EmployeeResponsibleInternalTypeCode 283486 | | 0..1 283488 | |

FIG. 283-18

| Package | level 1 | level 2 | level 3 | level 4 | level 5 | Cardinality | Datatype Name |
|---|---|---|---|---|---|---|---|
| | | | | Planned-Process-ingPeriod 283490 | | 0..1 283492 | UPPEROPEN_TIMEZONEINDEPENDENT_DateTimePeriod 283494 |
| | | | | Description 283496 | | 0..1 283498 | SHORT_Description 283500 |
| | | | | Detailed-Text 283502 | | 0..1 283504 | Text 283506 |
| | | | | Ordinal-Number-Value 283508 | | 1 283510 | OrdinalNumberValue 283512 |
| | | | | @actionCode 283514 | | 1 283516 | ActionCode 283518 |
| Activity 283520 | | | Activitiy 283522 | | | 0..n 283524 | |

FIG. 283-19

| Package | level 1 | level 2 | level 3 | level 4 | level 5 | Cardinality | Datatype Name |
|---|---|---|---|---|---|---|---|
| | | | | ID 283526 | | 1 283528 | MaintenanceRequestActivityID 283530 |
| | | | | ActivityMaintenanceIssueCategoryCatalogueID 283532 | | 0..1 283534 | MaintenanceIssueCategoryCatalogueID 283536 |
| | | | | ActivityParentMaintenanceIssueCategoryID 283538 | | 0..1 283540 | MaintenanceIssueCategoryID 283542 |
| | | | | ActivityMaintenanceIssueCategoryID 283544 | | 0..1 283546 | MaintenanceIssueCategoryID 283548 |

FIG. 283-20

| Package | level 1 | level 2 | level 3 | level 4 | level 5 | Cardinality | Datatype Name |
|---|---|---|---|---|---|---|---|
| | | | | Process-ingPeriod 283550 | | 0..1 283552 | UPPEROPEN_TIMEZONEINDEPENDENT_DateTimePeriod 283554 |
| | | | | Description 283556 | | 0..1 283558 | SHORT_Description 283560 |
| | | | | Detailed-Text 283562 | | 0..1 283564 | Text 283566 |
| | | | | Ordinal-Number-Value 283568 | | 1 283570 | OrdinalNumberValue 283572 |
| | | | | @actionCode 283574 | | 1 283576 | ActionCode 283578 |

FIG. 284

| Package | level 1 | level 2 | level 3 | Cardinality | Datatype Name |
|---|---|---|---|---|---|
| MaintenanceRequest-ChangeStatusMessage 28400 | MaintenanceRe-questChangeS-tatusMessage 28402 | | | | MaintenanceRequest-ChangeStatusMessage 28404 |
| MessageHeader 28406 | | Message-Header 28408 | | 0..1 28410 | BasicBusinessDocument-MessageHeader 28412 |
| MaintenanceRequest 28414 | | Mainte-nanceRequest 28416 | | 0..1 28418 | |
| | | | ID 28420 | 1 28422 | MaintenanceRequestID 28424 |
| Log 28426 | | Log 28428 | | 1 28430 | Log 28432 |

FIG. 285

| Package | level 1 | level 2 | Cardinality | Datatype Name |
|---|---|---|---|---|
| MaintenanceRequest-CloseConfirmationMessage_sync 28500 | MaintenanceRequestCloseConfirmationMessage_sync 28502 | | | MaintenanceRequestCloseConfirmationMessage_sync 28504 |
| MessageHeader 28506 | | Message-Header 28508 | 0..1 28510 | BasicBusinessDocumentMessageHeader 28512 |
| Log 28514 | | Log 28516 | 1 28518 | Log 28520 |

FIG. 286

| Package | level 1 | level 2 | level 3 | Cardinality | Datatype Name |
|---|---|---|---|---|---|
| MaintenanceRequestCloseRequestMessage_sync 28600 | MaintenanceRequestCloseRequestMessage_sync 28602 | | | | MaintenanceRequestCloseRequestMessage_sync 28604 |
| MessageHeader 28606 | | MessageHeader 28608 | | 0..1 28610 | BasicBusinessDocumentMessageHeader 28612 |
| MaintenanceRequest 28614 | | MaintenanceRequest 28616 | | 0..1 28618 | |
| | | | ID 28620 | 1 28622 | MaintenanceRequestID 28624 |

FIG. 287

| Package | level 1 | level 2 | level 3 | Cardinality | Datatype Name |
|---|---|---|---|---|---|
| MaintenanceRequestCreateConfirmationMessage_sync 28700 | MaintenanceRequestCreateConfirmationMessage_sync 28702 | | | | MaintenanceRequestCreateConfirmationMessage_sync 28704 |
| MessageHeader 28706 | | MessageHeader 28708 | | 0..1 28710 | BasicBusinessDocumentMessageHeader 28712 |
| MaintenanceRequest 28714 | | MaintenanceRequest 28716 | | 1 28718 | |
| | | | ID 28720 | 1 28722 | MaintenanceRequestID 28724 |
| Log 28726 | | Log 28728 | | 1 28730 | Log 28732 |

FIG. 288-1

| Package | level 1 | level 2 | level 3 | level 4 | level 5 | Cardinality | Datatype Name |
|---|---|---|---|---|---|---|---|
| MaintenanceRequestCreateRequestMessage_sync 28800 | MaintenanceRequestCreateRequestMessage_sync 28802 | | | | | | MaintenanceRequestCreateRequestMessage_sync 28804 |
| MessageHeader 28806 | | MessageHeader 28808 | | | | 0..1 28810 | BasicBusinessDocumentMessageHeader 28812 |
| MaintenanceRequest 28814 | | MaintenanceRequest 28816 | | | | 1 28818 | |
| | | | ProjectWorkBreakdownStructureElementID 28820 | | | 0..1 28822 | ProjectWorkBreakdownStructureElementID 28824 |

FIG. 288-2

| Package | level 1 | level 2 | level 3 | level 4 | level 5 | Cardinality | Datatype Name |
|---|---|---|---|---|---|---|---|
| | | | IssueMaintenanceIssueCategoryCatalogueID 28826 | | | 0..1 28828 | MaintenanceIssueCategoryCatalogueID 28830 |
| | | | IssueParentMaintenanceIssueCategoryID 28832 | | | 0..1 28834 | MaintenanceIssueCategoryID 28836 |
| | | | IssueMaintenanceIssueCategoryID 28838 | | | 0..1 28840 | MaintenanceIssueCategoryID 28842 |
| | | | MaterialInternalID 28844 | | | 0..1 28846 | ProductInternalID 28848 |
| | | | InstallationPointID 28850 | | | 0..1 28852 | InstallationPointID 28854 |

FIG. 288-3

| Package | level 1 | level 2 | level 3 | level 4 | level 5 | Cardinality | Datatype Name |
|---|---|---|---|---|---|---|---|
| | | | IndividualMaterialID 28856 | | | 0..1 28858 | ProductInternalID 28860 |
| | | | SerialID 28862 | | | 0..1 28864 | SerialID 28866 |
| | | | MaintenancePlantID 28868 | | | 0..1 28870 | PlantID 28872 |
| | | | MaintenancePlanningPlantID 28874 | | | 0..1 28876 | PlantID 28878 |
| | | | MaintenanceWorkCentreID 28880 | | | 0..1 28882 | WorkCentreID 28884 |
| | | | MaintenanceWorkCentrePlantID 28886 | | | 0..1 28888 | PlantID 28890 |

FIG. 288-4

| Package | level 1 | level 2 | level 3 | level 4 | level 5 | Cardinality | Datatype Name |
|---|---|---|---|---|---|---|---|
| | | | ReporterInternalID 28892 | | | 0..1 28894 | PartyInternalID 28896 |
| | | | LocationInternalID 28898 | | | 0..1 288100 | LocationInternalID 288102 |
| | | | AffectedInstallationPointID 288104 | | | 0..1 288106 | InstallationPointID 288108 |
| | | | AffectedIndividualMaterialID 288110 | | | 0..1 288112 | ProductInternalID 288114 |
| | | | ReportedDateTime 288116 | | | 0..1 288118 | TIMEZONEINDEPENDENT_DateTime 288120 |

FIG. 288-5

| Package | | | | level 1 | level 2 | level 3 | level 4 | level 5 | Cardinality | Datatype Name |
|---|---|---|---|---|---|---|---|---|---|---|
| | | | | | | TypeCode 288122 | | | 1 288124 | Mainte-nanceRe-questType-Code 288126 |
| | | | | | | Importance-Code 288128 | | | 0..1 288130 | Importance-Code 288132 |
| | | | | | | Production-Planner-GroupCode 288134 | | | 0..1 288136 | Production-Planner-GroupCode 288138 |
| | | | | | | Requested-Processing-Period 288140 | | | 0..1 288142 | UPPEROPEN_TIMEZONEINDEPENDENT_DateTimePeriod 288144 |
| | | | | | | Machinery-Breakdown-Indicator 288146 | | | 0..1 288148 | Indicator 288150 |

FIG. 288-6

| Package | | | | level 1 | level 2 | level 3 | level 4 | level 5 | Cardinality | Datatype Name |
|---|---|---|---|---|---|---|---|---|---|---|
| | | | | | | Machinery-Malfunction-Period 288152 | | | 0..1 288154 | UPPEROPEN_TIMEZONEINDEPENDENT_DateTimePeriod 288156 |
| | | | | | | Machinery-Breakdown-Duration 288158 | | | 0..1 288160 | Duration 288162 |
| | | | | | | Description 288164 | | | 0..1 288166 | SHORT_Description 288168 |
| | | | | | | DetailedText 288170 | | | 0..1 288172 | Text 288174 |
| | | Item 288176 | | | | Item 288178 | | | 0..n 288180 | |
| | | | | | | | MaterialInternalID 288182 | | 0..1 288184 | ProductInternalID 288186 |

FIG. 288-7

| Package | level 1 | level 2 | level 3 | level 4 | level 5 | Cardinality | Datatype Name |
|---|---|---|---|---|---|---|---|
| | | | | Damage-Mainte-nanceIssue-Category-CatalogueID 288188 | | 0..1 288190 | Mainte-nanceIssue-CategoryCata-logueID 288192 |
| | | | | DamagePar-entMainte-nanceIssue-CategoryID 288194 | | 0..1 288196 | Mainte-nanceIssue-CategoryID 288198 |
| | | | | Damage-Mainte-nanceIssue-CategoryID 288200 | | 0..1 288202 | Mainte-nanceIssue-CategoryID 288204 |
| | | | | ObjectPart-Mainte-nanceIssue-Category-CatalogueID 288206 | | 0..1 288208 | Mainte-nanceIssue-CategoryCata-logueID 288210 |

FIG. 288-8

| Package | level 1 | level 2 | level 3 | level 4 | level 5 | Cardinality | Datatype Name |
|---|---|---|---|---|---|---|---|
| | | | | ObjectPart-ParentMain-tenanceIs-sueCate-goryID 288212 | | 0..1 288214 | Mainte-nanceIssue-CategoryID 288216 |
| | | | | ObjectPart-Mainte-nanceIssue-CategoryID 288218 | | 0..1 288220 | Mainte-nanceIssue-CategoryID 288222 |
| | | | | Description 288224 | | 0..1 288226 | SHORT_Desc ription 288228 |
| | | | | DetailedText 288230 | | 0..1 288232 | Text 288234 |
| | | | | OrdinalNum-berValue 288236 | | 1 288238 | OrdinalNum-berValue 288240 |
| Cause 288242 | | | | Cause 288244 | | 0..n 288246 | |

FIG. 288-9

| Package | level 1 | level 2 | level 3 | level 4 | level 5 | Cardinality | Datatype Name |
|---|---|---|---|---|---|---|---|
| | | | | | CauseMaintenanceIssueCategoryCatalogueID 288248 | 0..1 288250 | MaintenanceIssueCategoryCatalogueID 288252 |
| | | | | | CauseParentMaintenanceIssueCategoryID 288254 | 0..1 288256 | MaintenanceIssueCategoryID 288258 |
| | | | | | CauseMaintenanceIssueCategoryID 288260 | 0..1 288262 | MaintenanceIssueCategoryID 288264 |
| | | | | | Description 288266 | 0..1 288268 | SHORT_Description 288270 |
| | | | | | DetailedText 288272 | 0..1 288274 | Text 288276 |

FIG. 288-10

| Package | level 1 | level 2 | level 3 | level 4 | level 5 | Cardinality | Datatype Name |
|---|---|---|---|---|---|---|---|
| | | | | | OrdinalNumberValue 288278 | 1 288280 | OrdinalNumberValue 288282 |
| Task 288284 | | | | Task 288286 | | 0..n 288288 | |
| | | | | | EmployeeResponsibleInternalID 288290 | 0..1 288292 | PartyInternalID 288294 |
| | | | | | CompleterInternalID 288296 | 0..1 288298 | PartyInternalID 288300 |
| | | | | | TaskMaintenanceIssueCategoryCatalogueID 288302 | 0..1 288304 | MaintenanceIssueCategoryCatalogueID 288306 |

FIG. 288-11

| Package | level 1 | level 2 | level 3 | level 4 | level 5 | Cardinality | Datatype Name |
|---|---|---|---|---|---|---|---|
| | | | | | TaskParent-Mainte-nanceIssue-CategoryID 288308 | 0..1 288310 | Mainte-nanceIssue-CategoryID 288312 |
| | | | | | TaskMainte-nanceIssue-CategoryID 288314 | 0..1 288316 | Mainte-nanceIssue-CategoryID 288318 |
| | | | | | EmployeeR-esponsibleIn-ternalType-Code 288320 | 0..1 288322 | BusinessOb-jectTypeCode 288324 |
| | | | | | Planned-Processing-Period 288326 | 0..1 288328 | UPPEROPEN_TIMEZONEINDEPENDENT_DateTimePeriod 288330 |

FIG. 288-12

| Package | level 1 | level 2 | level 3 | level 4 | level 5 | Cardinality | Datatype Name |
|---|---|---|---|---|---|---|---|
| | | | | | Description 288332 | 0..1 288334 | SHORT_Description 288336 |
| | | | | | DetailedText 288338 | 0..1 288340 | Text 288342 |
| | | | | | OrdinalNumberValue 288344 | 1 288346 | OrdinalNumberValue 288348 |
| Activitiy 288350 | | | | Activitiy 288352 | | 0..n 288354 | |
| | | | | | ActivityMaintenanceIssueCategoryCatalogueID 288356 | 0..1 288358 | MaintenanceIssueCategoryCatalogueID 288360 |
| | | | | | ActivityParentMaintenanceIssueCategoryID 288362 | 0..1 288364 | MaintenanceIssueCategoryID 288366 |

FIG. 288-13

| Package | level 1 | level 2 | level 3 | level 4 | level 5 | Cardinality | Datatype Name |
|---|---|---|---|---|---|---|---|
| | | | | | ActivityMain-tenanceIs-sueCate-goryID 288368 | 0..1 288370 | Mainte-nanceIssue-CategoryID 288372 |
| | | | | | Processing-Period 288374 | 0..1 288376 | UPPEROPEN_TIMEZONEI_NDEPENDEN_T_DateTimeP_eriod 288378 |
| | | | | | Description 288380 | 0..1 288382 | SHORT_Desc ription 288384 |
| | | | | | DetailedText 288386 | 0..1 288388 | Text 288390 |
| | | | | | OrdinalNum-berValue 288392 | 1 288394 | OrdinalNum-berValue 288396 |
| Task 288398 | | | Task 288400 | | | 0..n 288402 | |

FIG. 288-14

| Package | | | level 1 | level 2 | level 3 | level 4 | level 5 | Cardinality | Datatype Name |
|---|---|---|---|---|---|---|---|---|---|
| | | | | | | EmployeeR-esponsibleIn-ternalID 288404 | | 0..1 288406 | PartyInter-nalID 288408 |
| | | | | | | Completer-InternalID 288410 | | 0..1 288412 | PartyInter-nalID 288414 |
| | | | | | | TaskMainte-nanceIssue-Category-CatalogueID 288416 | | 0..1 288418 | Mainte-nanceIssue-CategoryCata-logueID 288420 |
| | | | | | | TaskParent-Mainte-nanceIssue-CategoryID 288422 | | 0..1 288424 | Mainte-nanceIssue-CategoryID 288426 |
| | | | | | | TaskMainte-nanceIssue-CategoryID 288428 | | 0..1 288430 | Mainte-nanceIssue-CategoryID 288432 |

FIG. 288-15

| Package | | | level 1 | level 2 | level 3 | level 4 | level 5 | Cardinality | Datatype Name |
|---|---|---|---|---|---|---|---|---|---|
| | | | | | | EmployeeR-esponsibleIn-ternalType-Code 288434 | | 0..1 288436 | |
| | | | | | | Planned-Processing-Period 288438 | | 0..1 288440 | UPPEROPEN_TIMEZONEINDEPENDENT_DateTimePeriod 288442 |
| | | | | | | Description 288444 | | 0..1 288446 | SHORT_Description 288448 |
| | | | | | | DetailedText 288450 | | 0..1 288452 | Text 288454 |
| | | | | | | OrdinalNum-berValue 288456 | | 1 288458 | OrdinalNum-berValue 288460 |
| | | Activity 288462 | | | Activitiy 288464 | | | 0..n 288466 | |

FIG. 288-16

| Package | | | level 1 | level 2 | level 3 | level 4 | level 5 | Cardinality | Datatype Name |
|---|---|---|---|---|---|---|---|---|---|
| | | | | | | ActivityMaintenanceIssueCategoryCatalogueID 288468 | | 0..1 288470 | MaintenanceIssueCategoryCatalogueID 288472 |
| | | | | | | ActivityParentMaintenanceIssueCategoryID 288474 | | 0..1 288476 | MaintenanceIssueCategoryID 288478 |
| | | | | | | ActivityMaintenanceIssueCategoryID 288480 | | 0..1 288482 | MaintenanceIssueCategoryID 288484 |
| | | | | | | ProcessingPeriod 288486 | | 0..1 288488 | UPPEROPEN_TIMEZONEINDEPENDENT_DateTimePeriod 288490 |

FIG. 288-17

| Package | | | level 1 | level 2 | level 3 | level 4 | level 5 | Cardinality | Datatype Name |
|---|---|---|---|---|---|---|---|---|---|
| | | | | | | Description 288492 | | 0..1 288494 | SHORT_Description 288496 |
| | | | | | | DetailedText 288498 | | 0..1 288500 | Text 288502 |
| | | | | | | OrdinalNumberValue 288504 | | 1 288506 | OrdinalNumberValue 288508 |

FIG. 289

| Package | | level 1 | level 2 | level 3 | Cardinality | Datatype Name |
|---|---|---|---|---|---|---|
| MaintenanceRequestImportanceCodeByTypeCodeQueryMessage_sync 28900 | | MaintenanceRequestImportanceCodeByTypeCodeQueryMessage_sync 28902 | | | | MaintenanceRequestImportanceCodeByTypeCodeQueryMessage_sync 28904 |
| | Selection 28906 | | MaintenanceRequestImportanceCodeByTypeCode 28908 | | 1 28910 | |
| | | | | MaintenanceRequestTypeCode 28912 | 1 28914 | MaintenanceRequestTypeCode 28916 |

FIG. 290

| Package | level 1 | level 2 | level 3 | Cardinality | Datatype Name |
|---|---|---|---|---|---|
| MaintenanceRequestImportanceCodeByTypeCodeResponseMessage_sync 29000 | MaintenanceRequestImportanceCodeByTypeCodeResponseMessage_sync 29002 | | | | MaintenanceRequestImportanceCodeByTypeCodeResponseMessage_sync 29004 |
| MaintenanceRequest 29006 | | MaintenanceRequestImportanceCode 29008 | | 0..n 29010 | |
| | | | Code 29012 | 1 29014 | ImportanceCode 29016 |
| | | | Name 29018 | 0..1 29020 | LEN20_Name 29022 |
| Log 29024 | | Log 29026 | | 1 29028 | Log 29030 |

FIG. 291

| Package | level 1 | level 2 | level 3 | Cardinality | Datatype Name |
|---|---|---|---|---|---|
| MaintenanceRequestReleaseConfirmationMessage_sync 29100 | MaintenanceRequestReleaseConfirmationMessage_sync 29102 | | | | MaintenanceRequestReleaseConfirmationMessage_sync 29104 |
| MessageHeader 29106 | | MessageHeader 29108 | | 0..1 29110 | BasicBusinessDocumentMessageHeader 29112 |
| Log 29114 | | Log 29116 | | 1 29118 | Log 29120 |

FIG. 292

| Package | level 1 | level 2 | level 3 | Cardinality | Datatype Name |
|---|---|---|---|---|---|
| MaintenanceRequestReleaseRequestMessage_sync 29200 | MaintenanceRequestReleaseRequestMessage_sync 29202 | | | | MaintenanceRequestReleaseRequestMessage_sync 29204 |
| MessageHeader 29206 | | MessageHeader 29208 | | 0..1 29210 | BasicBusinessDocumentMessageHeader 29212 |
| MaintenanceRequest 29214 | | MaintenanceRequest 29216 | | 0..1 29218 | |
| | | | ID 29220 | 1 29222 | MaintenanceRequestID 29224 |

FIG. 293

| Package | | level 1 | level 2 | level 3 | Cardinality | Datatype Name |
|---|---|---|---|---|---|---|
| MaintenanceRequestSimpleByIndividualMaterialAndInstallationPointQueryMessage_sync 29300 | | MaintenanceRequestSimpleByIndividualMaterialAndInstallationPointQueryMessage_sync 29302 | | | | MaintenanceRequestSimpleByIndividualMaterialAndInstallationPointQueryMessage_sync 29304 |
| | MessageHeader 29306 | | MessageHeader 29308 | | 0..1 29310 | BasicBusinessDocumentMessageHeader 29312 |
| | Selection 29314 | | MaintenanceRequestSimpleSelectionByIndividualMaterialAndInstallationPoint 29316 | | 1 29318 | |
| | | | | InstallationPointID 29320 | 0..1 29322 | InstallationPointID 29324 |
| | | | | IndividualMaterialID 29326 | 0..1 29328 | ProductInternalID 29330 |

FIG. 294-1

| Package | | level 1 | level 2 | level 3 | Cardinality | Datatype Name |
|---|---|---|---|---|---|---|
| MaintenanceRequestSimpleByIndividualMaterialAndInstallationPointResponseMessage_sync 29400 | | MaintenanceRequestSimpleByIndividualMaterialAndInstallationPointResponseMessage_sync 29402 | | | | MaintenanceRequestSimpleByIndividualMaterialAndInstallationPointResponseMessage_sync 29404 |
| | MessageHeader 29406 | | MessageHeader 29408 | | 0..1 29410 | BasicBusinessDocumentMessageHeader 29412 |
| | MaintenanceRequest 29414 | | MaintenanceRequest 29416 | | 0..n 29418 | |
| | | | | ID 29420 | 1 29422 | MaintenanceRequestID 29424 |
| | | | | TypeCode 29426 | 1 29428 | MaintenanceRequestTypeCode 29430 |
| | | | | Description 29432 | 0..1 29434 | SHORT_Description 29436 |

FIG. 294-2

| Package | | level 1 | level 2 | level 3 | Cardinality | Datatype Name |
|---|---|---|---|---|---|---|
| | Log 29438 | | Log 29440 | | 1 29442 | Log 29444 |

FIG. 313

| Package | level 1 | level 2 | | Cardinality | Datatype Name |
|---|---|---|---|---|---|
| MaterialBasicDataByIDQueryMessage_sync 313000 | MaterialBasicDataByIDQueryMessage_sync 313002 | | | | MaterialBasicDataByIDQueryMessage_sync 313004 |
| Selection 313006 | | MaterialBasicDataSelectionByID 313008 | | 1 313010 | MaterialBasicDataSelectionByID 313012 |
| | | | MaterialInternalID 313014 | 1 313016 | ProductInternalID 313018 |

FIG. 314-1

| Package | level 1 | level 2 | level 3 | | | Cardinality | Datatype Name |
|---|---|---|---|---|---|---|---|
| MaterialBasicDataBy-IDResponseMes-sage_sync 314000 | Material-BasicDataBy-IDResponse-Message_sync 314002 | | | | | | MaterialBasicDa-taByIDResponse-Message_sync 314004 |
| Material 314006 | | Material 314008 | | | | 1 314010 | Material 314012 |
| | | | InternalID 314014 | | | 1 314016 | ProductInternalID 314018 |
| | | | TypeCode 314020 | | | 1 314022 | MaterialTypeCode 314024 |
| | | | Industrial-Sector-Code 314026 | | | 1 314028 | MaterialIndustrial-SectorCode 314030 |
| | | | Previous-Name 314032 | | | 0..1 314034 | LANGUAGEINDEPE NDENT_MEDIUM_ Name 314036 |

FIG. 314-2

| Package | | level 1 | level 2 | level 3 | | | Cardinality | Datatype Name |
|---|---|---|---|---|---|---|---|---|
| | | | | DeletedIndicator 314038 | | | 0..1 314040 | Indicator 314042 |
| | | | | DivisionCode 314044 | | | 0..1 314046 | DivisionCode 314048 |
| | | | | DivisionDescription 314050 | | | 0..1 314052 | LEN20_Description 314054 |
| | | | | Description 314056 | | | 1..n 314058 | Description 314060 |
| | | | | | | Description 314062 | 1 314064 | SHORT_Description 314066 |
| | | | | GlobalTradeItemNumber 314068 | | | 0..n 314070 | GlobalTradeItemNumber 314072 |

FIG. 314-3

| Package | | level 1 | level 2 | level 3 | | | Cardinality | Datatype Name |
|---|---|---|---|---|---|---|---|---|
| | | | | | | Product-StandardID 314074 | 1 314076 | ProductStandardID 314078 |
| | | | | | | Measure-UnitCode 314080 | 1 314082 | MeasureUnitCode 314084 |
| | | | | Quanti-tyUnit 314086 | | | 1..n 314088 | Quantity Unit 314090 |
| | | | | | Quantity 314092 | | 1 314094 | Quantity 314096 |
| | | | | | Material-BaseQuan-tity 314098 | | 1 3140100 | Quantity 3140102 |
| | | | | | BaseQuan-tityUnitIn-dicator 3140104 | | 0..1 3140106 | Indicator 3140108 |

FIG. 314-4

| Package | | level 1 | level 2 | level 3 | | | Cardinality | Datatype Name |
|---|---|---|---|---|---|---|---|---|
| | | | | | Material-Weights 3140110 | | 0..1 3140112 | ProductWeights 3140114 |
| | | | | | | measure-UnitCode 3140116 | 1 3140118 | MeasureUnitCode 3140120 |
| | | | | | | GrossWeigh tMeasure 3140122 | 0..1 3140124 | Measure 3140126 |
| | | | | | | NetWeight-Measure 3140128 | 0..1 3140130 | Measure 3140132 |
| | | | | | | TareWeight-Measure 3140134 | 0..1 3140136 | Measure 3140138 |
| | | | | | Materi-alDimen-sions 3140140 | | 0..1 3140142 | ProductDimensions 3140144 |

FIG. 314-5

| Package | | level 1 | level 2 | level 3 | | | Cardinality | Datatype Name |
|---|---|---|---|---|---|---|---|---|
| | | | | | | measure-UnitCode 3140146 | 1 3140148 | MeasureUnitCode 3140150 |
| | | | | | | Height-Measure 3140152 | 0..1 3140154 | Measure 3140156 |
| | | | | | | LengthMeasure 3140158 | 0..1 3140160 | Measure 3140162 |
| | | | | | | Width-Measure 3140164 | 0..1 3140166 | Measure 3140168 |
| | | | | | Volume-Measure 3140170 | | 0..1 3140172 | Measure 3140174 |
| | Log 3140176 | | Log 3140178 | | | | 0..1 3140180 | Log 3140182 |

FIG. 315-1

| Package | level 1 | level 2 | | | Cardinality | Datatype Name |
|---|---|---|---|---|---|---|
| MaterialSalesSpecificationByElementsQueryMessage_sync 315000 | MaterialSalesSpecificationByElementsQueryMessage_sync 315002 | | | | | MaterialSalesSpecificationByElementsQueryMessage_sync 315004 |
| Selection 315006 | | MaterialSalesSpecificationSelectionByElements 315008 | | | 1 315010 | |
| | | | SelectionByMaterialInternalID 315012 | | 0..n 315014 | SelectionByMaterialInternalID 315016 |
| | | | | InclusionExclusionCode 315018 | 0..1 315020 | InclusionExclusionCode 315022 |
| | | | | IntervalBoundaryTypeCode 315024 | 1 315026 | IntervalBoundaryTypeCode 315028 |

FIG. 315-2

| Package | | | level 1 | level 2 | | | Cardinality | Datatype Name |
|---|---|---|---|---|---|---|---|---|
| | | | | | | LowerBoundary-MaterialInternalID 315030 | 0..1 315032 | ProductInternalID 315034 |
| | | | | | | UpperBoundary-MaterialInternalID 315036 | 0..1 315038 | ProductInternalID 315040 |
| | | | | | Selection-ByMateri-alDescrip-tion 315042 | | 0..n 315044 | SelectionByMateri-alDescription 315046 |
| | | | | | | InclusionExclu-sionCode 315048 | 0..1 315050 | InclusionExclusion-Code 315052 |
| | | | | | | IntervalBound-aryTypeCode 315054 | 1 315056 | IntervalBound-aryTypeCode 315058 |
| | | | | | | LowerBoundary-MaterialDescrip-tion 315060 | 0..1 315062 | SHORT_Description 315064 |

FIG. 315-3

| Package | | | level 1 | level 2 | | | Cardinality | Datatype Name |
|---|---|---|---|---|---|---|---|---|
| | | | | | | UpperBoundary-MaterialDescrip-tion 315066 | 0..1 315068 | SHORT_Description 315070 |
| | | | | | Selection-ByMaterial-Division-Code 315072 | | 0..n 315074 | SelectionByMaterial-DevisionCode 315076 |
| | | | | | | InclusionExclu-sionCode 315078 | 0..1 315080 | InclusionExclusion-Code 315082 |
| | | | | | | IntervalBound-aryTypeCode 315084 | 1 315086 | IntervalBound-aryTypeCode 315088 |
| | | | | | | LowerBoundary-MaterialDivision-Code 315090 | 0..1 315092 | DivisionCode 315094 |

FIG. 315-4

| Package | | | level 1 | level 2 | | | Cardinality | Datatype Name |
|---|---|---|---|---|---|---|---|---|
| | | | | | | UpperBoundary-MaterialDivision-Code 315096 | 0..1 315098 | DivisionCode 3150100 |
| | | | | | Selection-ByMaterial-SalesSpeci-fication-SalesOr-ganisa-tionID 3150102 | | 0..n 3150104 | SelectionByMaterial-SalesSpecification-SalesOrganisationID 3150106 |
| | | | | | | InclusionExclu-sionCode 3150108 | 0..1 3150110 | InclusionExclusion-Code 3150112 |
| | | | | | | IntervalBound-aryTypeCode 3150114 | 1 3150116 | IntervalBound-aryTypeCode 3150118 |

FIG. 315-5

| Package | | | level 1 | level 2 | | | Cardinality | Datatype Name |
|---|---|---|---|---|---|---|---|---|
| | | | | | | LowerBoundary-MaterialSalespeci-ficationSalesOr-ganisationID 3150120 | 0..1 3150122 | OrganisationCen-treID 3150124 |
| | | | | | | UpperBoundary-MaterialSalespeci-ficationSalesOr-ganisationID 3150126 | 0..1 3150128 | OrganisationCen-treID 3150130 |
| | | | | | Selection-ByMaterial-SalesSpeci-ficationDis-tribution-Channel-Code 3150132 | | 0..n 3150134 | SelectionByMaterial-SalesSpecifica-tionDistributionChan-nelCode 3150136 |
| | | | | | | InclusionExclu-sionCode 3150138 | 0..1 3150140 | InclusionExclusion-Code 3150142 |

FIG. 315-6

| Package | | | level 1 | level 2 | | | Cardinality | Datatype Name |
|---|---|---|---|---|---|---|---|---|
| | | | | | | IntervalBoundaryTypeCode 3150144 | 1 3150146 | IntervalBoundaryTypeCode 3150148 |
| | | | | | | LowerBoundaryMaterialSalesSpecificationDistributionChannelCode 3150150 | 0..1 3150152 | DistributionChannelCode 3150154 |
| | | | | | | UpperBoundaryMaterialSalesSpecificationDistributionChannelCode 3150156 | 0..1 3150158 | DistributionChannelCode 3150160 |
| | | | | | MaximumNumberValue 3150162 | | 0..1 3150164 | NumberValue 3150166 |

FIG. 316-1

| Package | | level 1 | level 2 | level 3 | | Cardinality | Datatype Name |
|---|---|---|---|---|---|---|---|
| MaterialSalesSpecificationByElementsResponseMessage_sync 316000 | | MaterialSalesSpecificationByElementsResponseMessage_syncc 316002 | | | | | MaterialSalesSpecificationByElementsResponseMessage_sync 316004 |
| | Material 316006 | | Material 316008 | | | 0..N 316010 | |
| | | | | InternalID 316012 | | 1 316014 | ProductInternalID 316016 |
| | | | | Description 316018 | | 1..N 316020 | |
| | | | | | Description 316022 | 1 316024 | SHORT_Description 316026 |
| | | | | SalesSpecification 316028 | | 0..N 316030 | |
| | | | | | SalesOrganisationID 316032 | 0..1 316034 | OrganisationCentreID 316036 |

| Package | | level 1 | level 2 | level 3 | | Cardinality | Datatype Name |
|---|---|---|---|---|---|---|---|
| | | | | | SalesOrganisationFormatted-Name 316038 | 0..1 316040 | LANGUAGEINDEPENDENT_MEDIUM_Name 316042 |
| | | | | | DistributionChannelCode 316044 | 0..1 316046 | DistributionChannelCode 316048 |
| | | | | | DistributionChannelName 316050 | 0..1 316052 | MEDIUM_Name 316054 |
| | Log 316056 | | Log 316058 | | | 1 316060 | Log 316062 |

| Package | level 1 | level 2 | | Cardinality | Datatype Name |
|---|---|---|---|---|---|
| MaterialSalesSpecification-ByIDQueryMessage_sync 317000 | MaterialSalesSpecifica-tionByIDQueryMes-sage_sync 317002 | | | | MaterialSalesSpeci-ficationByIDQuery-Message_sync 317004 |
| Selection 317006 | | MaterialSalesSpeci-ficationSelection-ByID 317008 | | 1 317010 | |
| | | | MaterialInternalID 317012 | 1 317014 | ProductInternalID 317016 |
| | | | Material-SalesSpecifica-tionSalesOrganisa-tionID 317018 | 0..1 317020 | OrganisationCen-treID 317022 |
| | | | Material-SalesSpecifica-tionDistribution-ChannelCode 317024 | 0..1 317026 | DistributionChan-nelCode 317028 |

FIG. 318-1

| Package | | level 1 | level 2 | level 3 | | Cardinality | Datatype Name |
|---|---|---|---|---|---|---|---|
| MaterialSalesSpecificationByIDResponseMessage_sync 318000 | | Material-SalesSpecificationBy-IDResponseMessage_sync 318002 | | | | | MaterialSalesSpecificationByIDResponseMessage_sync 318004 |
| | Material 318006 | | Material 318008 | | | 0..1 318010 | |
| | | | | InternalID 318012 | | 1 318014 | ProductInternalID 318016 |
| | | | | DivisionCode 318018 | | 0..1 318020 | DivisionCode 318022 |
| | | | | DivisionDescription 318024 | | 0..1 318026 | LEN20_Description 318028 |
| | | | | Description 318030 | | 1..N 318032 | |

FIG. 318-2

| Package | | level 1 | level 2 | level 3 | | Cardinality | Datatype Name |
|---|---|---|---|---|---|---|---|
| | | | | | Description 318034 | 1 318036 | SHORT_Description 318038 |
| | | | | SalesSpecifica-tion 318040 | | 0..N 318042 | |
| | | | | | SalesOrganisa-tionID 318044 | 0..1 318046 | OrganisationCentreID 318048 |
| | | | | | SalesOrganisa-tionFormatted-Name 318050 | 0..1 318052 | LANGUAGEINDEPENDE NT_MEDIUM_Name 318054 |
| | | | | | Distribution-ChannelCode 318056 | 0..1 318058 | DistributionChannelCode 318060 |
| | | | | | Distribution-ChannelName 318062 | 0..1 318064 | MEDIUM_Name 318066 |

FIG. 318-3

| Package | | level 1 | level 2 | level 3 | | Cardinality | Datatype Name |
|---|---|---|---|---|---|---|---|
| | | | | | SalesMeasureUnitCode 318068 | 0..1 318070 | MeasureUnitCode 318072 |
| | Log 318074 | | Log 318076 | | | 1 318078 | Log 318080 |

FIG. 319

| Package | level 1 | level 2 | | Cardinality | Datatype Name |
|---|---|---|---|---|---|
| MaterialSimpleByGTIN-QueryMessage_sync 319000 | MaterialSimple-ByGTINQuery-Message_sync 319002 | | | | MaterialSimple-ByGTINQuery-Message_sync 319004 |
| Selection 319006 | | MaterialSelec-tionByGTIN 319008 | | 1 319010 | MaterialSelection-ByGTIN 319012 |
| | | | ProductStan-dardID 319014 | 1 319016 | ProductStandardID 319018 |

FIG. 320

| Package | level 1 | level 2 | level 3 | | Cardinality | Datatype Name |
|---|---|---|---|---|---|---|
| MaterialSimpleByGTIN-ResponseMessage_sync 320000 | MaterialSimple-ByGTINResponse-Message_sync 320002 | | | | | MaterialSimple-ByGTINResponseMes-sage_sync 320004 |
| Material 320006 | | Material 320008 | | | 0..n 320010 | Material 320012 |
| | | | InternalID 320014 | | 1 320016 | ProductInternalID 320018 |
| | | | Description 320020 | | 1 320022 | Description 320024 |
| | | | | Descrip-tion 320026 | 1 320028 | SHORT_Description 320030 |
| Log 320032 | | Log 320034 | | | 0..1 320036 | Log 320038 |

FIG. 321-1

| Package | level 1 | level 2 | | | Cardinality | Datatype Name |
|---|---|---|---|---|---|---|
| MaterialSimpleByIDAndDescriptionQueryMessage_sync 321000 | MaterialSimpleByIDAndDescriptionQueryMessage_sync 321002 | | | | | MaterialSimpleByIDAndDescriptionQueryMessage_sync 321004 |
| Selection 321006 | | MaterialSelectionByIDAndDescription 321008 | | | 1 321010 | MaterialSelectionByIDAndDescription 321012 |
| | | | SelectionByMaterialInternalID 321014 | | 0..n 321016 | SelectionByMaterialInternalID 321018 |
| | | | | InclusionExclusionCode 321020 | 0..1 321022 | InclusionExclusionCode 321024 |

FIG. 321-2

| Package | level 1 | level 2 | | | Cardinality | Datatype Name |
|---|---|---|---|---|---|---|
| | | | | Interval-Bound-aryType-Code 321026 | 1 321028 | IntervalBoundaryType-Code 321030 |
| | | | | Lower-Boundary-MaterialIn-ternalID 321032 | 0..1 321034 | ProductInternalID 321036 |
| | | | | Upper-Boundary-MaterialIn-ternalID 321038 | 0..1 321040 | ProductInternalID 321042 |
| | | | SelectionBy-MaterialDe-scription 321044 | | 0..n 321046 | SelectionByMaterialDe-scription 321048 |

FIG. 321-3

| Package | level 1 | level 2 | | | Cardinality | Datatype Name |
|---|---|---|---|---|---|---|
| | | | | Inclusion-Exclusion-Code 321050 | 0..1 321052 | InclusionExclusionCode 321054 |
| | | | | Interval-Bound-aryType-Code 321056 | 1 321058 | IntervalBoundaryType-Code 321060 |
| | | | | Lower-Boundary-Materi-alDescrip-tion 321062 | 0..1 321064 | SHORT_Description 321066 |
| | | | | Upper-Boundary-Materi-alDescrip-tion 321068 | 0..1 321070 | SHORT_Description 321072 |

FIG. 321-4

| Package | level 1 | level 2 | | | Cardinality | Datatype Name |
|---|---|---|---|---|---|---|
| | | | Maximum-NumberValue 321074 | | 0..1 321076 | NumberValue 321078 |

FIG. 322

| Package | level 1 | level 2 | level 3 | | Cardinality | Datatype Name |
|---|---|---|---|---|---|---|
| MaterialSimpleByIDAndDescriptionResponseMessage_sync 322000 | MaterialSimpleByIDAndDescriptionResponseMessage_sync 322002 | | | | | MaterialSimpleByIDAndDescriptionResponseMessage_sync 322004 |
| Material 322006 | | Material 322008 | | | 0..n 322010 | Material 322012 |
| | | | InternalID 322014 | | 1 322016 | ProductInternalID 322018 |
| | | | Description 322020 | | 1 322022 | Description 322024 |
| | | | | Description 322026 | 1 322028 | SHORT_Description 322030 |
| Log 322032 | | Log 322034 | | | 0..1 322036 | Log 322038 |

FIG. 323

| Package | level 1 | level 2 | | Cardinality | Datatype Name |
|---|---|---|---|---|---|
| MaterialSimpleBySearchtextQueryMessage_sync 323000 | MaterialSimpleBySearchtextQueryMessage_sync 323002 | | | | MaterialSimpleBySearchtextQueryMessage_sync 323004 |
| Selection 323006 | | MaterialSelectionBySearchtext 323008 | | 1 323010 | MaterialSelectionBySearchtext 323012 |
| | | | SearchText 323014 | 1 323016 | SearchText 323018 |
| | | | MaximumNumberValue 323020 | 0..1 323022 | NumberValue 323024 |

FIG. 324

| Package | level 1 | level 2 | level 3 | | Cardinality | Datatype Name |
|---|---|---|---|---|---|---|
| MaterialSimpleBySearchtextResponseMessage_sync 324000 | MaterialSimpleBySearchtextResponseMessage_sync 324002 | | | | | MaterialSimpleBySearchtextResponseMessage_sync 324004 |
| Material 324006 | | Material 324008 | | | 0..n 324010 | Material 324012 |
| | | | InternalID 324014 | | 1 324016 | ProductInternalID 324018 |
| | | | Description 324020 | | 1 324022 | Description 324024 |
| | | | | Description 324026 | 1 324028 | SHORT_Description 324030 |
| Log 324032 | | Log 324034 | | | 0..1 324036 | Log 324038 |

FIG. 325

| Package | level 1 | level 2 | level 3 | | Cardinality | Datatype Name |
|---|---|---|---|---|---|---|
| MaterialSimpleResponseMessage 325000 | MaterialSimpleResponseMessage 325002 | | | | | MaterialSimpleResponseMessage 325004 |
| Material 325006 | | Material 325008 | | | 0..n 325010 | Material 325012 |
| | | | InternalID 325014 | | 1 325016 | ProductInternalID 325018 |
| | | | Description 325020 | | 1 325022 | Description 325024 |
| | | | | Description 325026 | 1 325028 | SHORT_Description 325030 |
| Log 325032 | | Log 325034 | | | 0..1 325036 | Log 325038 |

FIG. 349-1

| Package | level 1 | level 2 | level 3 | level 4 | Cardinality | Datatype Name |
|---|---|---|---|---|---|---|
| MaterialInspection-BasicDataByEle-mentsQueryMes-sage 349000 | MaterialInspection-BasicDataByEle-mentsQueryMes-sage_sync 349002 | | | | | MaterialInspectionBasicDataByE-lementsQueryMessage_sync 349004 |
| Selection 349006 | | MaterialIn-spectionBa sicDataSe-lectionByE-lements 349008 | | | 1 349010 | |
| | | | TypeCode 349012 | | 0..1 349014 | InspectionTypeCode 349016 |
| | | | DueDate 349018 | | 0..1 349020 | TIMEZONEINDEPENDENT_DateTi me 349022 |
| | | | Selection-ByMateri-alInternalID 349024 | | 0..n 349026 | SelectionByMaterialInternalID 349028 |

FIG. 349-2

| Package | level 1 | level 2 | level 3 | level 4 | Cardinality | Datatype Name |
|---|---|---|---|---|---|---|
| | | | | Inclusion-Exclu-sionCode 349030 | 0..1 349032 | InclusionExclusionCode 349034 |
| | | | | Interval-Bound-aryType-Code 349036 | 1 349038 | IntervalBoundaryTypeCode 349040 |
| | | | | Lower-Bound-aryMateri-alInter-nalID 349042 | 0..1 349044 | ProductInternalID 349046 |
| | | | | Upper-Bound-aryMateri-alInter-nalID 349048 | 0..1 349050 | ProductInternalID 349052 |

FIG. 349-3

| Package | level 1 | level 2 | level 3 | level 4 | Cardinality | Datatype Name |
|---|---|---|---|---|---|---|
| | | | Selection-ByPlantID 349054 | | 0..n 349056 | SelectionByPlantID 349058 |
| | | | | Inclusion-Exclu-sionCode 349060 | 0..1 349062 | InclusionExclusionCode 349064 |
| | | | | Interval-Bound-aryType-Code 349066 | 1 349068 | IntervalBoundaryTypeCode 349070 |
| | | | | Lower-Bound-aryPlantID 349072 | 0..1 349074 | PlantID 349076 |
| | | | | Upper-Bound-aryPlantID 349078 | 0..1 349080 | PlantID 349082 |

FIG. 349-4

| Package | level 1 | level 2 | level 3 | level 4 | Cardinality | Datatype Name |
|---|---|---|---|---|---|---|
| | | | Selection-ByBatchID 349084 | | 0..n 349086 | SelectionByBatchID 349088 |
| | | | | Inclusion-Exclu-sionCode 349090 | 0..1 349092 | InclusionExclusionCode 349094 |
| | | | | Interval-Bound-aryType-Code 349096 | 1 349098 | IntervalBoundaryTypeCode 3490100 |
| | | | | Lower-Boundary-BatchID 3490102 | 0..1 3490104 | BatchID 3490106 |
| | | | | Upper-Bound-aryBatchI D 3490108 | 0..1 3490110 | BatchID 3490112 |

FIG. 349-5

| Package | level 1 | level 2 | level 3 | level 4 | Cardinality | Datatype Name |
|---|---|---|---|---|---|---|
| | | | SupplierID 3490114 | | 0..1 3490116 | SupplierID 3490118 |
| | | | CustomerID 3490120 | | 0..1 3490122 | CustomerID 3490124 |
| | | | LifeCycleS-tatusCode 3490126 | | 1 3490128 | MaterialInspectionLifeCycleStatus-Code 3490130 |
| ProcessingCon-ditions 3490132 | | Process-ingCondi-tions 3490134 | | | 1 3490136 | |
| | | | QueryHits-Maximum-Number-Value 3490138 | | 0..1 3490140 | NumberValue 3490142 |

FIG. 349-6

| Package | level 1 | level 2 | level 3 | level 4 | Cardinality | Datatype Name |
|---|---|---|---|---|---|---|
| | | | Unlimited-QueryHitsIn-dicator 3490144 | | 0..1 3490146 | Indicator 3490148 |

FIG. 350-1

| Package | level 1 | level 2 | level 3 | level 4 | level 5 | Cardinality | Datatype Name |
|---|---|---|---|---|---|---|---|
| MaterialInspection-BasicDataByElementsResponse-Message 350000 | MaterialInspectionBasicDataByElements-ResponseMessage_sync 350002 | | | | | | MaterialInspection-BasicDataByElements-ResponseMessage_sync 350004 |
| MaterialInspection 350006 | | MaterialInspection 350008 | | | | 0..n 350010 | |
| | | | ID 350012 | | | 1 350014 | MaterialInspectionID 350016 |
| | | | LifeCycleStatusCode 350018 | | | 1 350020 | MaterialInspectionLifeCycleStatusCode 350022 |
| | | | Skipping-StatusCode 350024 | | | 1 350026 | MaterialInspectionSkippingStatusCode 350028 |
| | | | TypeCode 350030 | | | 1 350032 | InspectionTypeCode 350034 |

FIG. 350-2

| Package | level 1 | level 2 | level 3 | level 4 | level 5 | Cardinality | Datatype Name |
|---|---|---|---|---|---|---|---|
| | | | DueDate 350036 | | | 0..1 350038 | TIMEZONEINDEPENDENT_DateTime 350040 |
| | | | Priority-Code 350042 | | | 1 350044 | PriorityCode 350046 |
| | | | MaterialIn-ternalID 350048 | | | 1 350050 | ProductInternalID 350052 |
| | | | PlantID 350054 | | | 1 350056 | PlantID 350058 |
| | | | BatchID 350060 | | | 0..1 350062 | BatchID 350064 |
| | | | SupplierID 350066 | | | 0..1 350068 | SupplierID 350070 |
| | | | CustomerID 350072 | | | 0..1 350074 | CustomerID 350076 |

FIG. 350-3

| Package | level 1 | level 2 | level 3 | level 4 | level 5 | Cardinality | Datatype Name |
|---|---|---|---|---|---|---|---|
| BusinessTrans-actionDocumen-tReference 350078 | | | Business-Transac-tionDocu-mentRefer-ence 350080 | | | 0..1 350082 | |
| PurchaseOr-derReference 350084 | | | | Pur-chaseOr-derRefer-ence 350086 | | 0..1 350088 | |
| | | | | | ID 350090 | 1 350092 | PurchaseOrderID 350094 |
| | | | | | ItemID 350096 | 1 350098 | PurchaseOrderItemID 3500100 |
| GoodsMove-mentRefer-ence 3500102 | | | | GoodsMo vemen-tRefer-ence 3500104 | | 0..1 3500106 | |

FIG. 350-4

| Package | level 1 | level 2 | level 3 | level 4 | level 5 | Cardinality | Datatype Name |
|---|---|---|---|---|---|---|---|
| | | | | | ID 3500108 | 1 3500110 | GoodsMovementID 3500112 |
| | | | | | ItemID 3500114 | 1 3500116 | GoodsMovementItemID 3500118 |
| | | | | | Year 3500120 | 1 3500122 | Year 3500124 |
| ProductionOrder-Reference 3500126 | | | | ProductionOrderReference 3500128 | | 0..1 3500130 | |
| | | | | | ID 3500132 | 1 3500134 | ProductionOrderID 3500136 |
| SalesOrder-Reference 3500138 | | | | SalesOrderReference 3500140 | | 0..1 3500142 | |
| | | | | | ID 3500144 | 1 3500146 | SalesOrderID 3500148 |

FIG. 350-5

| Package | level 1 | level 2 | level 3 | level 4 | level 5 | Cardinality | Datatype Name |
|---|---|---|---|---|---|---|---|
| | | | | | ItemID 3500150 | 1 3500152 | SalesOrderItemID 3500154 |
| OutboundDeliveryReference 3500156 | | | | OutboundDeliveryReference 3500158 | | 0..1 3500160 | |
| | | | | | ID 3500162 | 1 3500164 | DeliveryID 3500166 |
| | | | | | ItemID 3500168 | 1 3500170 | DeliveryItemID 3500172 |
| Decision 3500174 | | | Decision 3500176 | | | 0..1 3500178 | |
| | | | | ParentQualityIssueCategoryID 3500180 | | 1 3500182 | QualityIssueCategoryID 3500184 |

FIG. 350-6

| Package | level 1 | level 2 | level 3 | level 4 | level 5 | Cardinality | Datatype Name |
|---|---|---|---|---|---|---|---|
| | | | | QualityIs-sueCate-goryID 3500186 | | 1 3500188 | QualityIssueCategoryID 3500190 |
| | | | | Accep-tanceS-tatusCode 3500192 | | 1 3500194 | AcceptanceStatusCode 3500196 |
| | | | | Quality-ScoreOr-dinal-Number-Value 3500198 | | 1 3500200 | OrdinalNumberValue 3500202 |
| ProcessingCondi-tions 3500204 | | Process-ingCondi-tions 3500206 | | | | 1 3500208 | |

FIG. 350-7

| Package | level 1 | level 2 | level 3 | level 4 | level 5 | Cardinality | Datatype Name |
|---|---|---|---|---|---|---|---|
| | | | Returned-Query-HitsNum-berValue 3500210 | | | 1 3500212 | NumberValue 3500214 |
| | | | MoreEle-mentsAvail-ableIndica-tor 3500216 | | | 1 3500218 | Indicator 3500220 |
| Log 3500222 | | Log 3500224 | | | | 1 3500226 | Log 3500228 |

FIG. 351

| Package | level 1 | level 2 | level 3 | Cardinality | Datatype Name |
|---|---|---|---|---|---|
| MaterialInspectionBy-IDQueryMessage 351000 | MaterialInspectionBy-IDQueryMes-sage_sync 351002 | | | | MaterialInspectionByIDQueryMes-sage_sync 351004 |
| Selection 351006 | | MaterialInspec-tionSelectionByID 351008 | | 1 351010 | |
| | | | ID 351012 | 1 351014 | MaterialInspectionID 351016 |

FIG. 352-1

| Package | level 1 | level 2 | level 3 | level 4 | level 5 | Cardinality | Datatype Name |
|---|---|---|---|---|---|---|---|
| MaterialInspectionByIDResponseMessage 352000 | MaterialInspectionByIDResponseMessage_sync 352002 | | | | | | MaterialInspectionByIDResponseMessage_sync 352004 |
| MaterialInspection 352006 | | MaterialInspection 352008 | | | | 0..n 352010 | |
| | | | ID 352012 | | | 1 352014 | MaterialInspectionID 352016 |
| | | | SystemAdministrativeData 352018 | | | 1 352020 | SystemAdministrativeData 352022 |
| | | | StatusObject 352024 | | | 1 352026 | StatusObject 352028 |

FIG. 352-2

| Package | level 1 | level 2 | level 3 | level 4 | level 5 | Cardinality | Datatype Name |
|---|---|---|---|---|---|---|---|
| | | | LifeCycleS-tatusCode 352030 | | | 1 352032 | MaterialInspectionLifeCy-cleStatusCode 352034 |
| | | | LifeCycleS-tatusName 352036 | | | 0..1 352038 | MEDIUM_Name 352040 |
| | | | Skipping-StatusCode 352042 | | | 1 352044 | MaterialInspectionSkip-pingStatusCode 352046 |
| | | | TypeCode 352048 | | | 1 352050 | InspectionTypeCode 352052 |
| | | | TypeName 352054 | | | 0..1 352056 | MEDIUM_Name 352058 |
| | | | DueDate 352060 | | | 0..1 352062 | TIMEZONEINDEPENDEN T_DateTime 352064 |
| | | | PriorityCode 352066 | | | 1 352068 | PriorityCode 352070 |

FIG. 352-3

| Package | level 1 | level 2 | level 3 | level 4 | level 5 | Cardinality | Datatype Name |
|---|---|---|---|---|---|---|---|
| | | | PriorityName 352072 | | | 0..1 352074 | MEDIUM_Name 352076 |
| | | | MaterialIn-ternalID 352078 | | | 1 352080 | ProductInternalID 352082 |
| | | | MaterialDe-scription 352084 | | | 0..1 352086 | SHORT_Description 352088 |
| | | | PlantID 352090 | | | 1 352092 | PlantID 352094 |
| | | | BatchID 352096 | | | 0..1 352098 | BatchID 3520100 |
| | | | SupplierID 3520102 | | | 0..1 3520104 | SupplierID 3520106 |
| | | | Supplier-Formatted-Name 3520108 | | | 0..1 3520110 | LONG_Name 3520112 |

FIG. 352-4

| Package | level 1 | level 2 | level 3 | level 4 | level 5 | Cardinality | Datatype Name |
|---|---|---|---|---|---|---|---|
| | | | CustomerID 3520114 | | | 0..1 3520116 | CustomerID 3520118 |
| | | | Customer-Formatted-Name 3520120 | | | 0..1 3520122 | LONG_Name 3520124 |
| | | | Lot-SizeQuantity 3520126 | | | 1 3520128 | Quantity 3520130 |
| | | | Sample-SizeQuantity 3520132 | | | 0..1 3520134 | Quantity 3520136 |
| RuleSnap-shot 3520138 | | | RuleSnap-shot 3520140 | | | 0..1 3520142 | |
| | | | | Inspection-BillOfOp-erations-GroupID 3520144 | | 0..1 3520146 | InspectionBillOfOpera-tionsGroupID 3520148 |

FIG. 352-5

| Package | level 1 | level 2 | level 3 | level 4 | level 5 | Cardinality | Datatype Name |
|---|---|---|---|---|---|---|---|
| | | | | InspectionBillOfOperationsID 3520150 | | 0..1 3520152 | InspectionBillOfOperationsID 3520154 |
| | | | | InspectionBillOfOperationsDescription 3520156 | | 0..1 3520158 | SHORT_Description 3520160 |
| | | | | ProductionBillOfOperationsGroupID 3520162 | | 0..1 3520164 | ProductionBillOfOperationsGroupID 3520166 |
| | | | | ProductionBillOfOperationsID 3520168 | | 0..1 3520170 | ProductionBillOfOperationsID 3520172 |

FIG. 352-6

| Package | level 1 | level 2 | level 3 | level 4 | level 5 | Cardinality | Datatype Name |
|---|---|---|---|---|---|---|---|
| | | | | Production-BillOfOp-eration-sTypeCode 3520174 | | 0..1 3520176 | ProductionBillOfOpera-tionsTypeCode 3520178 |
| | | | | Production-BillOfOp-erationsDe-scription 3520180 | | 0..1 3520182 | SHORT_Description 3520184 |
| | | | | Sample-Drawing-Proce-dureID 3520186 | | 0..1 3520188 | SampleDrawingProce-dureID 3520190 |
| | | | | Sample-Drawing-Procedure-Description 3520192 | | 0..1 3520194 | SHORT_Description 3520196 |

FIG. 352-7

| Package | level 1 | level 2 | level 3 | level 4 | level 5 | Cardinality | Datatype Name |
|---|---|---|---|---|---|---|---|
| BusinessTransactionDocumentReference 3520198 | | | BusinessTransactionDocumentReference 3520200 | | | 0..1 3520202 | |
| PurchaseOrderReference 3520204 | | | | PurchaseOrderReference 3520206 | | 0..1 3520208 | |
| | | | | | ID 3520210 | 1 3520212 | PurchaseOrderID 3520214 |
| | | | | | ItemID 3520216 | 1 3520218 | PurchaseOrderItemID 3520220 |
| GoodsMovementReference 3520222 | | | | GoodsMovementReference 3520224 | | 0..1 3520226 | |

FIG. 352-8

| Package | level 1 | level 2 | level 3 | level 4 | level 5 | Cardinality | Datatype Name |
|---|---|---|---|---|---|---|---|
| | | | | | ID 3520228 | 1 3520230 | GoodsMovementID 3520232 |
| | | | | | ItemID 3520234 | 1 3520236 | GoodsMovementItemID 3520238 |
| | | | | | Year 3520240 | 1 3520242 | Year 3520244 |
| ProductionOrderReference 3520246 | | | | ProductionOrderReference 3520248 | | 0..1 3520250 | |
| | | | | | ID 3520252 | 1 3520254 | ProductionOrderID 3520256 |
| SalesOrderReference 3520258 | | | | SalesOrderReference 3520260 | | 0..1 3520262 | |
| | | | | | ID 3520264 | 1 3520266 | SalesOrderID 3520268 |

FIG. 352-9

| Package | level 1 | level 2 | level 3 | level 4 | level 5 | Cardinality | Datatype Name |
|---|---|---|---|---|---|---|---|
| | | | | | ItemID 3520270 | 1 3520272 | SalesOrderItemID 3520274 |
| Out-boundDe-liv-eryRefer-ence 3520276 | | | | Outbound-Deliv-eryRefer-ence 3520278 | | 0..1 3520280 | |
| | | | | | ID 3520282 | 1 3520284 | DeliveryID 3520286 |
| | | | | | ItemID 3520288 | 1 3520290 | DeliveryItemID 3520292 |
| Decision 3520294 | | | Decision 3520296 | | | 0..1 3520298 | |
| | | | | ParentQual-ityIssue-CategoryID 3520300 | | 1 3520302 | QualityIssueCategoryID 3520304 |

FIG. 352-10

| Package | level 1 | level 2 | level 3 | level 4 | level 5 | Cardinality | Datatype Name |
|---|---|---|---|---|---|---|---|
| | | | | ParentQual-ityIssue-Category-Name 3520306 | | 0..1 3520308 | MEDIUM_Name 3520310 |
| | | | | QualityIs-sueCate-goryID 3520312 | | 1 3520314 | QualityIssueCategoryID 3520316 |
| | | | | QualityIs-sueCate-goryName 3520318 | | 0..1 3520320 | MEDIUM_Name 3520322 |
| | | | | Accep-tanceS-tatusCode 3520324 | | 1 3520326 | AcceptanceStatusCode 3520328 |

FIG. 352-11

| Package | level 1 | level 2 | level 3 | level 4 | level 5 | Cardinality | Datatype Name |
|---|---|---|---|---|---|---|---|
| | | | | Quality-ScoreOrdinalNumberValue 3520330 | | 1 3520332 | OrdinalNumberValue 3520334 |
| | | | | SystemAdministrativeData 3520336 | | 1 3520338 | SystemAdministrativeData 3520340 |
| Log 3520342 | | Log 3520344 | | | | 1 3520346 | Log 3520348 |

FIG. 353-1

| Package | level 1 | level 2 | level 3 | level 4 | Cardinality | Datatype Name |
|---|---|---|---|---|---|---|
| MaterialInspectionDecision-CreateConfirmationMessage 353000 | MaterialInspectionDecisionCreateConfirmation-Message_sync 353002 | | | | | MaterialInspectionDecisionCreateConfirmationMessage_sync 353004 |
| Message-Header 353006 | | Message-Header 353008 | | | 0..1 353010 | BasicBusinessDocumentMessageHeader 353012 |
| MaterialInspection 353014 | | MaterialInspection 353016 | | | 0..1 353018 | |
| | | | ID 353020 | | 1 353022 | MaterialInspectionID 353024 |
| | | | StatusObject 353026 | | 1 353028 | StatusObject 353030 |
| | | | LifeCycleStatus-Code 353032 | | 1 353034 | MaterialInspectionLifeCycleStatusCode 353036 |

FIG. 353-2

| Package | level 1 | level 2 | level 3 | level 4 | Cardinality | Datatype Name |
| --- | --- | --- | --- | --- | --- | --- |
| | | | LifeCy-cleStatus-Name 353038 | | 0..1 353040 | MEDIUM_Name 353042 |
| Subset 353044 | | | Decision 353046 | | 1 353048 | |
| | | | | ParentQual-ityIssue-CategoryID 353050 | 1 353052 | QualityIssueCategoryID 353054 |
| | | | | ParentQual-ityIssue-Category-Name 353056 | 0..1 353058 | MEDIUM_Name 353060 |
| | | | | QualityIs-sueCate-goryID 353062 | 1 353064 | QualityIssueCategoryID 353066 |

FIG. 353-3

| Package | level 1 | level 2 | level 3 | level 4 | Cardinality | Datatype Name |
|---|---|---|---|---|---|---|
| | | | | QualityIs-sueCate-goryName 353068 | 0..1 353070 | MEDIUM_Name 353072 |
| | | | | Accep-tanceS-tatusCode 353074 | 1 353076 | AcceptanceStatusCode 353078 |
| Log 353080 | | Log 353082 | | | 1 353084 | Log 353086 |

FIG. 354-1

| Package | level 1 | level 2 | level 3 | level 4 | Cardinality | Datatype Name |
|---|---|---|---|---|---|---|
| MaterialInspection-DecisionCreateRe-questMessage 354000 | MaterialInspection-DecisionCreateRe-questMessage_sync 354002 | | | | | MaterialInspectionDeci-sionCreateRequestMes-sage_sync 354004 |
| MessageHeader 354006 | | Message-Header 354008 | | | 0..1 354010 | BasicBusinessDocu-mentMessageHeader 354012 |
| MaterialInspec-tion 354014 | | MaterialIn-spection 354016 | | | 1 354018 | |
| | | | ID 354020 | | 1 354022 | MaterialInspectionID 354024 |
| Decision 354026 | | | Decision 354028 | | 1 354030 | |
| | | | | ParentQualityIs-sueCategoryID 354032 | 1 354034 | QualityIssueCategoryID 354036 |
| | | | | QualityIssue-CategoryID 354038 | 1 354040 | QualityIssueCategoryID 354042 |

FIG. 354-2

| Package | level 1 | level 2 | level 3 | level 4 | Cardinality | Datatype Name |
|---|---|---|---|---|---|---|
| | | | | QualityScoreOrdinalNumberValue 354044 | 0..1 354046 | QualityIssueCategoryID 354048 |
| | | | | DetailedText 354050 | 0..1 354052 | Text 354054 |
| | | | | BatchExpirationDate 354056 | 0..1 354058 | Date 354060 |

FIG. 355

| Package | level 1 | level 2 | level 3 | level 4 | Cardinality | Datatype Name |
|---|---|---|---|---|---|---|
| MaterialInspection-SubsetCreateConfir-mationMessage 355000 | MaterialInspectionSub-setCreateConfirma-tionMessage_sync 355002 | | | | | MaterialInspectionSubset-CreateConfirmationMes-sage_sync 355004 |
| MessageHeader 355006 | | Message-Header 355008 | | | 0..1 355010 | BasicBusinessDocument-MessageHeader 355012 |
| MaterialInspection 355014 | | MaterialIn-spection 355016 | | | 0..1 355018 | |
| | | | ID 355020 | | 1 355022 | MaterialInspectionID 355024 |
| Subset 355026 | | | Subset 355028 | | 1 355030 | |
| | | | | ID 355032 | 1 355034 | InspectionSubsetID 355036 |
| Log 355038 | | Log 355040 | | | 1 355042 | Log 355044 |

FIG. 356-1

| Package | level 1 | level 2 | level 3 | level 4 | level 5 | Cardinality | Datatype Name |
|---|---|---|---|---|---|---|---|
| MaterialInspectionSubsetCreateRequest-Message 356000 | MaterialInspectionSubsetCreateRequest-Message_sync 356002 | | | | | | MaterialInspectionSubsetCreateRequestMessage_sync 356004 |
| MessageHeader 356006 | | Message Header 356008 | | | | 0..1 356010 | BasicBusinessDocumentMessageHeader 356012 |
| MaterialInspection 356014 | | MaterialInspection 356016 | | | | 1 356018 | |
| | | | ID 356020 | | | 1 356022 | MaterialInspectionID 356024 |
| Subset 356026 | | | Subset 356028 | | | 1 356030 | |

FIG. 356-2

| Package | level 1 | level 2 | level 3 | level 4 | level 5 | Cardinality | Datatype Name |
|---|---|---|---|---|---|---|---|
| | | | | Medium-Significant-Description 356032 | | 0..1 356034 | LANGUAGEINDEPENDENT_SHORT_Description 356036 |
| | | | | ShortSig-nificantDe-scription 356038 | | 0..1 356040 | LANGUAGEINDEPENDENT_SHORT_Description 356042 |
| | | | | Medium-Significant-Counter-Value 356044 | | 0..1 356046 | Value 356048 |
| | | | | ShortSig-nificant-Counter-Value 356050 | | 0..1 356052 | Value 356054 |

FIG. 356-3

| Package | level 1 | level 2 | level 3 | level 4 | level 5 | Cardinality | Datatype Name |
|---|---|---|---|---|---|---|---|
| Operation 356056 | | | | Operation 356058 | | 1 356060 | |
| | | | | | ID 356062 | 1 356064 | MaterialInspectionSubsetOperationID 356066 |

FIG. 357-1

| Package | level 1 | level 2 | level 3 | level 4 | level 5 | Cardinality | Datatype Name |
|---|---|---|---|---|---|---|---|
| MaterialInspectionSubsetDecisionCreateConfirmationMessage 357000 | MaterialInspectionSubsetDecisionCreate-Confirmation-Message_sync 357002 | | | | | | MaterialInspectionSubset-DecisionCreateConfirmationMessage_sync 357004 |
| MessageHeader 357006 | | MessageHeader 357008 | | | | 0..1 357010 | BasicBusinessDocument-MessageHeader 357012 |
| MaterialInspection 357014 | | MaterialInspection 357016 | | | | 0..1 357018 | |
| | | | ID 357020 | | | 1 357022 | MaterialInspectionID 357024 |
| Subset 357026 | | | Subset 357028 | | | 0..1 357030 | |
| | | | | ID 357032 | | 1 357034 | InspectionSubsetID 357036 |

FIG. 357-2

| Package | level 1 | level 2 | level 3 | level 4 | level 5 | Cardinality | Datatype Name |
|---|---|---|---|---|---|---|---|
| Decision 357038 | | | | Decision 357040 | | 1 357042 | |
| | | | | | ParentQuality-IssueCate-goryID 357044 | 1 357046 | QualityIssueCategoryID 357048 |
| | | | | | ParentQuality-IssueCate-goryName 357050 | 0..1 357052 | MEDIUM_Name 357054 |
| | | | | | QualityIssue-CategoryID 357056 | 1 357058 | QualityIssueCategoryID 357060 |
| | | | | | QualityIssue-Category-Name 357062 | 0..1 357064 | MEDIUM_Name 357066 |

FIG. 357-3

| Package | level 1 | level 2 | level 3 | level 4 | level 5 | Cardinality | Datatype Name |
|---|---|---|---|---|---|---|---|
| | | | | | AcceptanceS-tatusCode 357068 | 1 357070 | AcceptanceStatusCode 357072 |
| Log 357074 | | Log 357076 | | | | 1 357078 | Log 357080 |

FIG. 358-1

| Package | level 1 | level 2 | level 3 | level 4 | level 5 | Cardinality | Datatype Name |
|---|---|---|---|---|---|---|---|
| MaterialInspectionSubsetDecisionCreateRequestMessage 358000 | MaterialInspectionSubsetDecisionCreateRequestMessage_sync 358002 | | | | | | MaterialInspectionSubsetDecisionCreateRequestMessage_sync 358004 |
| MessageHeader 358006 | | MessageHeader 358008 | | | | 0..1 358010 | BasicBusinessDocumentMessageHeader 358012 |
| MaterialInspection 358014 | | MaterialInspection 358016 | | | | 1 358018 | |
| | | | ID 358020 | | | 1 358022 | MaterialInspectionID 358024 |
| Subset 358026 | | | Subset 358028 | | | 1 358030 | |
| | | | | ID 358032 | | 1 358034 | InspectionSubsetID 358036 |

FIG. 358-2

| Package | level 1 | level 2 | level 3 | level 4 | level 5 | Cardinality | Datatype Name |
|---|---|---|---|---|---|---|---|
| Decision 358038 | | | | Decision 358040 | | 1 358042 | |
| | | | | | ParentQualityIssueCategoryID 358044 | 1 358046 | QualityIssueCategoryID 358048 |
| | | | | | QualityIssueCategoryID 358050 | 1 358052 | QualityIssueCategoryID 358054 |

FIG. 359-1

| Package | level 1 | level 2 | level 3 | level 4 | Cardinality | Datatype Name |
|---|---|---|---|---|---|---|
| MaterialInspection-SubsetOperation-ByElementsQuery-Message 359000 | MaterialInspection-SubsetOperationByE-lementsQueryMes-sage_sync 359002 | | | | | MaterialInspectionSub-setOperationByEle-mentsQueryMes-sage_sync 359004 |
| Selection 359006 | | MaterialIn-spectionSub-setOpera-tionSelec-tionByEle-ments 359008 | | | 1 359010 | |
| | | | ID 359012 | | 0..1 359014 | MaterialInspectionID 359016 |
| | | | TypeCode 359018 | | 0..1 359020 | InspectionTypeCode 359022 |
| | | | DueDate 359024 | | 0..1 359026 | TIMEZONEINDEPEND ENT_DateTime 359028 |

FIG. 359-2

| Package | | level 1 | level 2 | level 3 | level 4 | Cardinality | Datatype Name |
|---|---|---|---|---|---|---|---|
| | | | | SelectionBy-MaterialInter-nalID 359030 | | 0..n 359032 | SelectionByMaterialIn-ternalID 359034 |
| | | | | | InclusionEx-clusionCode 359036 | 0..1 359038 | InclusionExclusion-Code 359040 |
| | | | | | Interval-BoundaryType Code 359042 | 1 359044 | IntervalBound-aryTypeCode 359046 |
| | | | | | LowerBound-aryMaterialIn-ternalID 359048 | 0..1 359050 | ProductInternalID 359052 |
| | | | | | UpperBound-aryMaterialIn-ternalID 359054 | 0..1 359056 | ProductInternalID 359058 |

FIG. 359-3

| Package | | level 1 | level 2 | level 3 | level 4 | Cardinality | Datatype Name |
|---|---|---|---|---|---|---|---|
| | | | | PlantID 359060 | | 0..1 359062 | PlantID 359064 |
| | | | | SelectionBy-BatchID 359066 | | 0..n 359068 | SelectionByBatchID 359070 |
| | | | | | InclusionEx-clusionCode 359072 | 0..1 359074 | InclusionExclusion-Code 359076 |
| | | | | | Interval-BoundaryType Code 359078 | 1 359080 | IntervalBound-aryTypeCode 359082 |
| | | | | | LowerBound-aryBatchID 359084 | 0..1 359086 | BatchID 359088 |
| | | | | | UpperBound-aryBatchID 359090 | 0..1 359092 | BatchID 359094 |

FIG. 359-4

| Package | | level 1 | level 2 | level 3 | level 4 | Cardinality | Datatype Name |
|---|---|---|---|---|---|---|---|
| | | | | SupplierID 359096 | | 0..1 359098 | SupplierID 3590100 |
| | | | | CustomerID 3590102 | | 0..1 3590104 | CustomerID 3590106 |
| | | | | SelectionBy-WorkCentreID 3590108 | | 0..n 3590110 | SelectionByWorkCen-treID 3590112 |
| | | | | | InclusionEx-clusionCode 3590114 | 0..1 3590116 | InclusionExclusion-Code 3590118 |
| | | | | | IntervalBound-aryTypeCode 3590120 | 1 3590122 | IntervalBound-aryTypeCode 3590124 |
| | | | | | LowerBound-aryWorkCen-treID 3590126 | 0..1 3590128 | WorkCentreID 3590130 |

FIG. 359-5

| Package | | level 1 | level 2 | level 3 | level 4 | Cardinality | Datatype Name |
|---|---|---|---|---|---|---|---|
| | | | | | UpperBoundaryWorkCentreID 3590132 | 0..1 3590134 | WorkCentreID 3590136 |
| | | | | SelectionByWorkCentrePlantID 3590138 | | 0..n 3590140 | SelectionByWorkCentrePlantID 3590142 |
| | | | | | InclusionExclusionCode 3590144 | 0..1 3590146 | InclusionExclusionCode 3590148 |
| | | | | | IntervalBoundaryTypeCode 3590150 | 1 3590152 | IntervalBoundaryTypeCode 3590154 |
| | | | | | LowerBoundaryWorkCentrePlantID 3590156 | 0..1 3590158 | PlantID 3590160 |

FIG. 359-6

| Package | | level 1 | level 2 | level 3 | level 4 | Cardinality | Datatype Name |
|---|---|---|---|---|---|---|---|
| | | | | | UpperBoundaryWorkCentrePlantID 3590162 | 0..1 3590164 | PlantID 3590166 |
| | | | | WorkCentreDescription 3590168 | | 0..1 3590170 | SHORT_Description 3590172 |
| | Processing-Conditions 3590174 | | Processing-Conditions 3590176 | | | 1 3590178 | |
| | | | | QueryHits-Maximum-NumberValue 3590180 | | 0..1 3590182 | NumberValue 3590184 |
| | | | | UnlimitedQueryHitsIndicator 3590186 | | 0..1 3590188 | Indicator 3590190 |

FIG. 360-1

| Package | level 1 | level 2 | level 3 | level 4 | level 5 | Cardinality | Datatype Name |
|---|---|---|---|---|---|---|---|
| MaterialInspection-SubsetOperationByElementsResponse-Message 360000 | MaterialInspection-SubsetOperationByElementsResponseMessage_sync 360002 | | | | | | MaterialInspectionSubsetOperationByElementsResponseMessage 360004 |
| MaterialInspection 360006 | | MaterialInspection 360008 | | | | 0..n 360010 | |
| | | | ID 360012 | | | 1 360014 | MaterialInspectionID 360016 |
| | | | LifeCycleStatusCode 360018 | | | 1 360020 | MaterialInspectionLifeCycleStatusCode 360022 |

FIG. 360-2

| Package | level 1 | level 2 | level 3 | level 4 | level 5 | Cardinality | Datatype Name |
|---|---|---|---|---|---|---|---|
| | | | Skipping-StatusCode 360024 | | | 1 360026 | MaterialInspec-tionSkipping-StatusCode 360028 |
| | | | TypeCode 360030 | | | 1 360032 | Inspection-TypeCode 360034 |
| | | | DueDate 360036 | | | 0..1 360038 | TIMEZONEINDEPENDENT_DateTime 360040 |
| | | | PriorityCode 360042 | | | 1 360044 | PriorityCode 360046 |
| | | | MaterialInter-nalID 360048 | | | 1 360050 | ProductInter-nalID 360052 |
| | | | PlantID 360054 | | | 1 360056 | PlantID 360058 |

FIG. 360-3

| Package | level 1 | level 2 | level 3 | level 4 | level 5 | Cardinality | Datatype Name |
|---|---|---|---|---|---|---|---|
| | | | BatchID 360060 | | | 0..1 360062 | BatchID 360064 |
| | | | SupplierID 360066 | | | 0..1 360068 | SupplierID 360070 |
| | | | CustomerID 360072 | | | 0..1 360074 | CustomerID 360076 |
| Subset 360078 | | | Subset 360080 | | | 1..n 360082 | |
| | | | | ID 360084 | | 1 360086 | InspectionSub-setID 360088 |
| | | | | TypeCode 360090 | | 1 360092 | InspectionSub-setTypeCode 360094 |
| | | | | MaterialIn-spectionSam-pleID 360096 | | 0..1 360098 | MaterialInspec-tionSampleID 3600100 |

FIG. 360-4

| Package | level 1 | level 2 | level 3 | level 4 | level 5 | Cardinality | Datatype Name |
|---|---|---|---|---|---|---|---|
| | | | | Description 3600102 | | 0..1 3600104 | LONG_Description 3600106 |
| Operation 3600108 | | | | Operation 3600110 | | 1..n 3600112 | |
| | | | | | ID 3600114 | 1 3600116 | MaterialInspectionSubsetOperationID 3600118 |
| | | | | | Description 3600120 | 0..1 3600122 | SHORT_Description 3600124 |
| | | | | | WorkCentreID 3600126 | 0..1 3600128 | WorkCentreID 3600130 |
| | | | | | WorkCentreDescription 3600132 | 0..1 3600134 | SHORT_Description 3600136 |

FIG. 360-5

| Package | level 1 | level 2 | level 3 | level 4 | level 5 | Cardinality | Datatype Name |
|---|---|---|---|---|---|---|---|
| | | | | | WorkCentrePlantID 3600138 | 0..1 3600140 | PlantID 3600142 |
| ProcessingConditions 3600144 | | ProcessingConditions 3600146 | | | | 1 3600148 | |
| | | | ReturnedQueryHitsNumberValue 3600150 | | | 1 3600152 | NumberValue 3600154 |
| | | | MoreElementsAvailableIndicator 3600156 | | | 1 3600158 | Indicator 3600160 |
| Log 3600162 | | Log 3600164 | | | | 1 3600166 | Log 3600168 |

FIG. 361-1

| Package | level 1 | level 2 | level 3 | level 4 | Cardinality | Datatype Name |
|---|---|---|---|---|---|---|
| MaterialInspectionSubsetOperationInspectionActivity-BasicDataByElementsQueryMessage 361000 | MaterialInspectionSubsetOperationInspectionActivityBasicDataByElementsQuery-Message_sync 361002 | | | | | MaterialInspectionSubsetOperationInspectionActivity-BasicDataByElementsQueryMessage_sync 361004 |
| Selection 361006 | | MaterialInspectionSubsetOperationInspectionActivity-BasicDataSelectionByElements 361008 | | | 1 361010 | |
| | | | ID 361012 | | 0..1 361014 | MaterialInspectionID 361016 |
| | | | SubsetID 361018 | | 0..1 361020 | InspectionSubsetID 361022 |
| | | | SubsetOperationID 361024 | | 0..1 361026 | MaterialInspectionSubsetOperationID 361028 |

FIG. 361-2

| Package | level 1 | level 2 | level 3 | level 4 | Cardinality | Datatype Name |
|---|---|---|---|---|---|---|
| | | | TypeCode 361030 | | 0..1 361032 | InspectionType-Code 361034 |
| | | | DueDate 361036 | | 0..1 361038 | TIMEZONEINDEPENDENT_DateTime 361040 |
| | | | SelectionByMate-rialInternalID 361042 | | 0..n 361044 | SelectionByMateri-alInternalID 361046 |
| | | | | InclusionExclu-sionCode 361048 | 0..1 361050 | InclusionExclu-sionCode 361052 |
| | | | | IntervalBound-aryTypeCode 361054 | 1 361056 | IntervalBound-aryTypeCode 361058 |
| | | | | LowerBound-aryMaterialInter-nalID 361060 | 0..1 361062 | ProductInternalID 361064 |

FIG. 361-3

| Package | level 1 | level 2 | level 3 | level 4 | Cardinality | Datatype Name |
|---|---|---|---|---|---|---|
| | | | | UpperBoundaryMaterialInternalID 361066 | 0..1 361068 | ProductInternalID 361070 |
| | | | PlantID 361072 | | 0..1 361074 | PlantID 361076 |
| | | | SelectionByBatchID 361078 | | 0..n 361080 | SelectionByBatchID 361082 |
| | | | | InclusionExclusionCode 361084 | 0..1 361086 | InclusionExclusionCode 361088 |
| | | | | IntervalBoundaryTypeCode 361090 | 1 361092 | IntervalBoundaryTypeCode 361094 |
| | | | | LowerBoundaryBatchID 361096 | 0..1 361098 | BatchID 3610100 |

FIG. 361-4

| Package | level 1 | level 2 | level 3 | level 4 | Cardinality | Datatype Name |
|---|---|---|---|---|---|---|
| | | | | UpperBoundary-BatchID 3610102 | 0..1 3610104 | BatchID 3610106 |
| | | | SupplierID 3610108 | | 0..1 3610110 | SupplierID 3610112 |
| | | | CustomerID 3610114 | | 0..1 3610116 | CustomerID 3610118 |
| | | | SelectionByWork-CentreID 3610120 | | 0..n 3610122 | SelectionByWork-CentreID 3610124 |
| | | | | InclusionExclu-sionCode 3610126 | 0..1 3610128 | InclusionExclu-sionCode 3610130 |
| | | | | IntervalBound-aryTypeCode 3610132 | 1 3610134 | IntervalBound-aryTypeCode 3610136 |
| | | | | LowerBound-aryWorkCentreID 3610138 | 0..1 3610140 | WorkCentreID 3610142 |

FIG. 361-5

| Package | level 1 | level 2 | level 3 | level 4 | Cardinality | Datatype Name |
|---|---|---|---|---|---|---|
| | | | | UpperBoundaryWorkCentreID 3610144 | 0..1 3610146 | WorkCentreID 3610148 |
| | | | SelectionByWorkCentrePlantID 3610150 | | 0..n 3610152 | SelectionByWorkCentrePlantID 3610154 |
| | | | | InclusionExclusionCode 3610156 | 0..1 3610158 | InclusionExclusionCode 3610160 |
| | | | | IntervalBoundaryTypeCode 3610162 | 1 3610164 | IntervalBoundaryTypeCode 3610166 |
| | | | | LowerBoundaryWorkCentrePlantID 3610168 | 0..1 3610170 | PlantID 3610172 |
| | | | | UpperBoundaryWorkCentrePlantID 3610174 | 0..1 3610176 | PlantID 3610178 |

FIG. 361-6

| Package | level 1 | level 2 | level 3 | level 4 | Cardinality | Datatype Name |
|---|---|---|---|---|---|---|
| | | | WorkCentreDescription 3610180 | | 0..1 3610182 | SHORT_Description 3610184 |
| | | | SelectionByInspectionSpecificationID 3610186 | | 0..n 3610188 | SelectionByWorkCentrePlantID 3610190 |
| | | | | InclusionExclusionCode 3610192 | 0..1 3610194 | InclusionExclusionCode 3610196 |
| | | | | IntervalBoundaryTypeCode 3610198 | 1 3610200 | IntervalBoundaryTypeCode 3610202 |
| | | | | LowerBoundaryInspectionSpecificationID 3610204 | 0..1 3610206 | InspectionSpecificationID 3610208 |

FIG. 361-7

| Package | level 1 | level 2 | level 3 | level 4 | Cardinality | Datatype Name |
|---|---|---|---|---|---|---|
| | | | | UpperBoundary-InspectionSpecificationID 3610210 | 0..1 3610212 | InspectionSpecificationID 3610214 |
| | | | InspectionActivityLifeCycleStatusCode 3610216 | | 0..1 3610218 | InspectionActivityLifeCycleStatus-Code 3610220 |
| | | | LongTermInspectionIndicator 3610222 | | 1 3610224 | Indicator 3610226 |
| Processing-Conditions 3610228 | | ProcessingConditions 3610230 | | | 1 3610232 | |
| | | | ReturnedQuery-HitsNumberValue 3610234 | | 0..1 3610236 | NumberValue 3610238 |

FIG. 361-8

| Package | level 1 | level 2 | level 3 | level 4 | Cardinality | Datatype Name |
|---|---|---|---|---|---|---|
| | | | MoreElement-sAvailableIndicator 3610240 | | 0..1 3610242 | Indicator 3610244 |

FIG. 362-1

| Package | level 1 | level 2 | level 3 | level 4 | level 5 | level 6 | Cardinality | Datatype Name |
|---|---|---|---|---|---|---|---|---|
| MaterialInspectionSubsetOperationInspectionActivity-BasicDataByElementsResponse-Message 362000 | MaterialInspectionSubsetOperationInspectionActivity-BasicDataByElementsResponseMessage_sync 362002 | | | | | | | MaterialInspectionSubsetOperationInspectionActivityBasicDataByElementsResponseMessage_sync 362004 |
| MaterialInspection 362006 | | MaterialInspection 362008 | | | | | 0..n 362010 | |
| | | | ID 362012 | | | | 1 362014 | MaterialInspectionID 362016 |
| Subset 362018 | | | Subset 362020 | | | | 1..n 362022 | |
| | | | | ID 362024 | | | 1 362026 | InspectionSubsetID 362028 |

FIG. 362-2

| Package | level 1 | level 2 | level 3 | level 4 | level 5 | level 6 | Cardinality | Datatype Name |
|---|---|---|---|---|---|---|---|---|
| | | | | Descrip-tion 362030 | | | 0..1 362032 | LONG_Description 362034 |
| Operation 362036 | | | | Operation 362038 | | | 1..n 362040 | |
| | | | | | ID 362042 | | 1 362044 | MaterialInspectionSubsetOperationID 362046 |
| | | | | | Descrip-tion 362048 | | 0..1 362050 | SHORT_Description 362052 |
| | | | | | InspectionActivity 362054 | | 1..n 362056 | |
| | | | | | | ID 362058 | 1 362060 | MaterialInspectionSubsetOperationInspectionActivityID 362062 |

FIG. 362-3

| Package | level 1 | level 2 | level 3 | level 4 | level 5 | level 6 | Cardinality | Datatype Name |
|---|---|---|---|---|---|---|---|---|
| | | | | | | Descrip-tion 362064 | 0..1 362066 | SHORT_Description 362068 |
| | | | | | | Inspec-tion-Specifi-cationID 362070 | 0..1 362072 | InspectionSpeci-ficationID 362074 |
| | | | | | | Inspec-tion-Specifi-cation-PlantID 362076 | 0..1 362078 | PlantID 362080 |
| | | | | | | Inspec-tion-Specifi-cationVersionID 362082 | 0..1 362084 | VersionID 362086 |

FIG. 362-4

| Package | level 1 | level 2 | level 3 | level 4 | level 5 | level 6 | Cardinality | Datatype Name |
|---|---|---|---|---|---|---|---|---|
| | | | | | | LifeCycleStatus Code 362088 | 1 362090 | InspectionActivityLifeCycleStatusCode 362092 |
| | | | | | | LifeCycleStatus Name 362094 | 0..1 362096 | MEDIUM_Name 362098 |
| | | | | | | RequiredIndicator 3620100 | 1 3620102 | Indicator 3620104 |
| | | | | | | LongTermInspectionIndicator 3620106 | 1 3620108 | Indicator 3620110 |

FIG. 362-5

| | Package | level 1 | level 2 | level 3 | level 4 | level 5 | level 6 | Cardinality | Datatype Name |
|---|---|---|---|---|---|---|---|---|---|
| | Processing-Conditions 3620112 | | Process-ingCondi-tions 3620114 | | | | | 1 3620116 | |
| | | | | Return-edQuery-HitsNum-berValue 3620118 | | | | 1 3620120 | NumberValue 3620122 |
| | | | | MoreEle-ment-sAvail-ableIndi-cator 3620124 | | | | 1 3620126 | Indicator 3620128 |
| | Log 3620130 | | Log 3620132 | | | | | 1 3620134 | Log 3620136 |

FIG. 363-1

| Package | level 1 | level 2 | level 3 | Cardinality | Datatype Name |
|---|---|---|---|---|---|
| MaterialInspectionSubsetOperationInspectionActivityByIDQuery-Message 363000 | MaterialInspectionSubsetOperationInspectionActivityByIDQueryMessage_sync 363002 | | | | MaterialInspectionSubsetOperationInspectionActivityByIDQueryMessage_sync 363004 |
| Selection 363006 | | MaterialInspectionSubsetOperationInspectionActivitySelectionByID 363008 | | 1 363010 | |
| | | | ID 363012 | 1 363014 | MaterialInspectionID 363016 |
| | | | SubsetID 363018 | 1 363020 | InspectionSubsetID 363022 |
| | | | SubsetOperationID 363024 | 1 363026 | MaterialInspectionSubsetOperationID 363028 |

FIG. 363-2

| Package | level 1 | level 2 | level 3 | Cardinality | Datatype Name |
|---|---|---|---|---|---|
| | | | SubsetOperationInspectionActivityID 363030 | 1 363032 | MaterialInspectionSubsetOperationInspectionActivityID 363034 |

FIG. 364-1

| Package | level 1 | level 2 | level 3 | level 4 | level 5 | level 6 | level 7 | Cardinality | Datatype Name |
|---|---|---|---|---|---|---|---|---|---|
| MaterialInspectionSubsetOperationInspectionActivityByIDResponseMessage 364000 | MaterialInspectionSubsetOperationInspectionActivityByIDResponseMessage_sync 364002 | | | | | | | | MaterialInspectionSubsetOperationInspectionActivityByIDResponseMessage_sync 364004 |
| MaterialInspection 364006 | | MaterialInspection 364008 | | | | | | 0..1 364010 | |
| | | | ID 364012 | | | | | 1 364014 | MaterialInspectionID 364016 |

FIG. 364-2

| Package | level 1 | level 2 | level 3 | level 4 | level 5 | level 6 | level 7 | Cardinality | Datatype Name |
|---|---|---|---|---|---|---|---|---|---|
| | | | ChangeStateID 364018 | | | | | 0..1 364020 | ChangeStateID 364022 |
| Subset 364024 | | | Subset 364026 | | | | | 1 364028 | |
| | | | | ID 364030 | | | | 1 364032 | InspectionSubsetID 364034 |
| | | | | TypeCode 364036 | | | | 1 364038 | InspectionSubsetTypeCode 364040 |
| | | | | MaterialInspectionSampleID 364042 | | | | 0..1 364044 | MaterialInspectionSampleID 364046 |

FIG. 364-3

| Package | level 1 | level 2 | level 3 | level 4 | level 5 | level 6 | level 7 | Cardinality | Datatype Name |
|---|---|---|---|---|---|---|---|---|---|
| | | | | Descrip-tion 364048 | | | | 0..1 364050 | LONG_Description 364052 |
| Operation 364054 | | | | Opera-tion 364056 | | | | 1 364058 | |
| | | | | | ID 364060 | | | 1 364062 | Materi-alInspec-tionSub-setOpera-tionID 364064 |
| | | | | | Descrip-tion 364066 | | | 0..1 364068 | SHORT_Descrip-tion 364070 |
| Inspec-tionActivity 364072 | | | | | Inspec-tionActiv-ity 364074 | | | 1 364076 | |

FIG. 364-4

| Package | level 1 | level 2 | level 3 | level 4 | level 5 | level 6 | level 7 | Cardinality | Datatype Name |
|---|---|---|---|---|---|---|---|---|---|
| | | | | | | ID 364078 | | 1 364080 | MaterialnspectionSubsetOperationInspectionActivityID 364082 |
| | | | | | | Description 364084 | | 0..1 364086 | SHORT_Description 364088 |
| | | | | | | InspectionSpecificationID 364090 | | 0..1 364092 | InspectionSpecificationID 364094 |
| | | | | | | InspectionSpecification-PlantID 364096 | | 0..1 364098 | PlantID 3640100 |

FIG. 364-5

| Package | level 1 | level 2 | level 3 | level 4 | level 5 | level 6 | level 7 | Cardinality | Datatype Name |
|---|---|---|---|---|---|---|---|---|---|
| | | | | | | InspectionSpecification-VersionID 3640102 | | 0..1 3640104 | VersionID 3640106 |
| | | | | | | LifeCycleStatusCode 3640108 | | 1 3640110 | InspectionActivityLifeCycleStatusCode 3640112 |
| | | | | | | LifeCycleStatusName 3640114 | | 0..1 3640116 | MEDIUM_Name 3640118 |
| | | | | | | Required-Indicator 3640120 | | 1 3640122 | Indicator 3640124 |

FIG. 364-6

| Package | level 1 | level 2 | level 3 | level 4 | level 5 | level 6 | level 7 | Cardinality | Datatype Name |
|---|---|---|---|---|---|---|---|---|---|
| | | | | | | LongTermInspectionIndicator 3640126 | | 1 3640128 | Indicator 3640130 |
| | | | | | | InspectionSampleSizeDeterminationAndValuationRuleID 3640132 | | 1 3640134 | InspectionSampleSizeDeterminationAndValuationRuleID 3640136 |

FIG. 364-7

| Package | level 1 | level 2 | level 3 | level 4 | level 5 | level 6 | level 7 | Cardinality | Datatype Name |
|---|---|---|---|---|---|---|---|---|---|
| | | | | | | InspectionSampleSizeDeterminationAndValuationRuleDescription 3640138 | | 0..1 3640140 | SHORT_Description 3640142 |
| | | | | | | SampleSizeQuantity 3640144 | | 1 3640146 | Quantity 3640148 |
| | | | | | | SampleDrawingQuantity 3640150 | | 1 3640152 | Quantity 3640154 |

FIG. 364-8

| Package | level 1 | level 2 | level 3 | level 4 | level 5 | level 6 | level 7 | Cardinality | Datatype Name |
|---|---|---|---|---|---|---|---|---|---|
| | | | | | | SingleValueResultRecordingRequiredIndicator 3640156 | | 1 3640158 | Indicator 3640160 |
| | | | | | | MeasureResultRecordingRequiredIndicator 3640162 | | 1 3640164 | Indicator 3640166 |

FIG. 364-9

| Package | level 1 | level 2 | level 3 | level 4 | level 5 | level 6 | level 7 | Cardinality | Datatype Name |
|---|---|---|---|---|---|---|---|---|---|
| | | | | | | QualityIssueCategoryResultRecordingRequiredIndicator 3640168 | | 1 3640170 | Indicator 3640172 |
| | | | | | | InspectedNumberValueResultRecordingRequiredIndicator 3640174 | | 1 3640176 | Indicator 3640178 |

FIG. 364-10

| Package | level 1 | level 2 | level 3 | level 4 | level 5 | level 6 | level 7 | Cardinality | Datatype Name |
|---|---|---|---|---|---|---|---|---|---|
| | | | | | | AccepTanceStatusCodeResultRecordingRequiredIndicator 3640180 | | 1 3640182 | Indicator 3640184 |
| | | | | | | Measure 3640186 | | 0..1 3640188 | Measure 3640190 |
| | | | | | | MeasureTypeCode 3640192 | | 0..1 3640194 | MeasureTypeCode 3640196 |
| | | | | | | LowerTolerance Measure 3640198 | | 0..1 3640200 | Mesaure 3640202 |

FIG. 364-11

| Package | level 1 | level 2 | level 3 | level 4 | level 5 | level 6 | level 7 | Cardinality | Datatype Name |
|---|---|---|---|---|---|---|---|---|---|
| | | | | | | Upper-Tolerance Measure 3640204 | | 0..1 3640206 | Mesaure 3640208 |
| | | | | | | CharacteristicAttribute-QualityIssueCategoryCatalogueID 3640210 | | 0..1 3640212 | QualityIssueCategoryCatalogueID 3640214 |
| | | | | | | CharacteristicAttributeParentQualityIssueCategoryID 3640216 | | 0..1 3640218 | QualityIssueCategoryID 3640220 |

FIG. 364-12

| Package | level 1 | level 2 | level 3 | level 4 | level 5 | level 6 | level 7 | Cardinality | Datatype Name |
|---|---|---|---|---|---|---|---|---|---|
| | | | | | | CharacteristicAttributeParentQualityIssueCategoryName 3640222 | | 0..1 3640224 | MEDIUM_Name 3640226 |
| | | | | | | CharacteristicAttributeQualityIssueCategoryFilterCode 3640228 | | 0..1 3640230 | IssueCategoryFilterCode 3640232 |

FIG. 364-13

| Package | level 1 | level 2 | level 3 | level 4 | level 5 | level 6 | level 7 | Cardinality | Datatype Name |
|---|---|---|---|---|---|---|---|---|---|
| | | | | | | FindingReportedIndicator 3640234 | | 0..1 3640236 | Indicator 3640238 |
| | | | | | | PlannedIndividualMaterialID 3640240 | | 0..1 3640242 | ProductID 3640244 |
| | | | | | | ActualIndividualMaterialID 3640246 | | 0..1 3640248 | ProductID 3640250 |
| | | | | | | FirstAdditionalInformationText 3640252 | | 0..1 3640254 | LANGUAGEINDEPENDENT_MEDIUM_Text 3640256 |

FIG. 364-14

| Package | level 1 | level 2 | level 3 | level 4 | level 5 | level 6 | level 7 | Cardinality | Datatype Name |
|---|---|---|---|---|---|---|---|---|---|
| | | | | | | SecondAdditionalInformationText 3640258 | | 0..1 3640260 | LANGUAGEINDEPENDENT_MEDIUM_Text 3640262 |
| | | | | | | ThirdAdditionalInformationText 3640264 | | 0..1 3640266 | LANGUAGEINDEPENDENT_MEDIUM_Text 3640268 |
| Result 3640270 | | | | | | Result 3640272 | | 0..n 3640274 | |
| | | | | | | | ID 3640276 | 1 3640278 | MaterialInspectionSubsetOperationInspectionActivityResul- |

FIG. 364-15

| Package | level 1 | level 2 | level 3 | level 4 | level 5 | level 6 | level 7 | Cardinality | Datatype Name |
|---|---|---|---|---|---|---|---|---|---|
| | | | | | | | | | tID 3640280 |
| | | | | | | | Measure 3640282 | 0..1 3640284 | Measure 3640286 |
| | | | | | | | Charac-teristicAt-tribute-QualityIs-sueCate-goryID 3640288 | 0..1 3640290 | QualityIs-sueCate-goryID 3640292 |
| | | | | | | | Charac-teristicAt-tribute-QualityIs-sueCate-goryName | 0..1 3640296 | MEDIUM_Name 3640298 |

FIG. 364-16

| Package | level 1 | level 2 | level 3 | level 4 | level 5 | level 6 | level 7 | Cardinality | Datatype Name |
|---|---|---|---|---|---|---|---|---|---|
| | | | | | | | 3640294 | | |
| | | | | | | | InspectedNumberValue 3640300 | 0..1 3640302 | NumberValue 3640304 |
| | | | | | | | DefectNumberValue 3640306 | 0..1 3640308 | NumberValue 3640310 |
| | | | | | | | AcceptanceStatusCode 3640312 | 0..1 3640314 | AcceptanceStatusCode 3640316 |

FIG. 364-17

| Package | level 1 | level 2 | level 3 | level 4 | level 5 | level 6 | level 7 | Cardinality | Datatype Name |
|---|---|---|---|---|---|---|---|---|---|
| | | | | | | | ExceptionIndicator 3640318 | 0..1 3640320 | Indicator 3640322 |
| | | | | | | | Comment 3640324 | 0..1 3640326 | LANGUAGEINDEPENDENT_Comment 3640328 |
| Log 3640330 | | Log 3640332 | | | | | | 1 3640334 | Log 3640336 |

FIG. 365-1

| Package | level 1 | level 2 | level 3 | level 4 | level 5 | level 6 | Cardinality | Datatype Name |
|---|---|---|---|---|---|---|---|---|
| MaterialInspectionSubsetOperationInspectionActivityCreateConfirmationMessage 365000 | MaterialInspectionSubsetOperationInspectionActivityCreateConfirmationMessage_sync 365002 | | | | | | | MaterialInspectionSubsetOperationInspectionActivityCreateConfirmationMessage_sync 365004 |
| MessageHeader 365006 | | Message Header 365008 | | | | | 0..1 365010 | BasicBusinessDocumentMessageHeader 365012 |
| MaterialInspection 365014 | | MaterialInspection 365016 | | | | | 0..1 365018 | |
| | | | ID 365020 | | | | 1 365022 | MaterialInspectionID 365024 |
| Subset 365026 | | | Subset 365028 | | | | 1 365030 | |

FIG. 365-2

| Package | level 1 | level 2 | level 3 | level 4 | level 5 | level 6 | Cardinality | Datatype Name |
|---|---|---|---|---|---|---|---|---|
| | | | | ID 365032 | | | 1 365034 | InspectionSubsetID 365036 |
| Operation 365038 | | | | Operation 365040 | | | 1 365042 | |
| | | | | | ID 365044 | | 1 365046 | MaterialInspectionSubsetOperationID 365048 |
| InspectionActivity 365050 | | | | | InspectionActivity 365052 | | 1 365054 | |
| | | | | | | ID 365056 | 1 365058 | MaterialInspectionSubsetOperationInspectionActivityID 365060 |
| Log 365062 | | Log 365064 | | | | | 1 365066 | Log 365068 |

FIG. 366-1

| Package | level 1 | level 2 | level 3 | level 4 | level 5 | level 6 | Cardinality | Datatype Name |
|---|---|---|---|---|---|---|---|---|
| MaterialInspectionSubsetOperationInspectionActivityCreateRequestMessage 366000 | MaterialInspectionSubsetOperationInspectionActivityCreateRequestMessage_sync 366002 | | | | | | | MaterialInspectionSubsetOperationInspectionActivityCreateRequestMessage_sync 366004 |
| MessageHeader 366006 | | MessageHeader 366008 | | | | | 0..1 366010 | BasicBusinessDocumentMessageHeader 366012 |
| MaterialInspection 366014 | | MaterialInspection 366016 | | | | | 1 366018 | |

FIG. 366-2

| Package | level 1 | level 2 | level 3 | level 4 | level 5 | level 6 | Cardinality | Datatype Name |
|---|---|---|---|---|---|---|---|---|
| | | | ID 366020 | | | | 1 366022 | MaterialInspectionID 366024 |
| Subset 366026 | | | Subset 366028 | | | | 1 366030 | |
| | | | | ID 366032 | | | 1 366034 | InspectionSubsetID 366036 |
| Operation 366038 | | | | Operation 366040 | | | 1 366042 | |
| | | | | | ID 366044 | | 1 366046 | MaterialInspection-SubsetOperationID 366048 |
| Inspec-tionAc-tivity 366050 | | | | | Inspec-tionActiv-ity 366052 | | 1 366054 | |
| | | | | | | Inspec-tionSpeci-ficationID 366056 | 1 366058 | InspectionSpecifica-tionID 366060 |

FIG. 366-3

| Package | level 1 | level 2 | level 3 | level 4 | level 5 | level 6 | Cardinality | Datatype Name |
|---|---|---|---|---|---|---|---|---|
| | | | | | | InspectionSpecification-PlantID 366062 | 1 366064 | PlantID 366066 |
| | | | | | | InspectionSpecification-VersionID 366068 | 1 366070 | VersionID 366072 |
| | | | | | | Description 366074 | 0..1 366076 | SHORT_Description 366078 |
| | | | | | | InspectionSampleSizeDeterminationAndValuationRuleID 366080 | 1 366082 | InspectionSampleSizeDeterminationAndValuationRuleID 366084 |

FIG. 366-4

| Package | level 1 | level 2 | level 3 | level 4 | level 5 | level 6 | Cardinality | Datatype Name |
|---|---|---|---|---|---|---|---|---|
| | | | | | | Sample-SizeQuantity 366086 | 1 366088 | Quantity 366090 |

FIG. 367-1

| Package | level 1 | level 2 | level 3 | level 4 | level 5 | level 6 | Cardinality | Datatype Name |
|---|---|---|---|---|---|---|---|---|
| MaterialInspectionSubsetOperationInspectionActivity-FindingCreateConfirmationMessage 367000 | MaterialInspectionSubsetOperationInspectionActivityFindingCreateConfirmationMessage_sync 367002 | | | | | | | MaterialInspectionSubsetOperationInspectionActivityFinding-CreateConfirmation-Message_sync 367004 |
| MessageHeader 367006 | | Message-Header 367008 | | | | | 0..1 367010 | BasicBusinessDocumentMessageHeader 367012 |
| MaterialInspection 367014 | | MaterialInspection 367016 | | | | | 0..1 367018 | |
| | | | ID 367020 | | | | 1 367022 | MaterialInspectionID 367024 |
| Subset 367026 | | | Subset 367028 | | | | 1 367030 | |

FIG. 367-2

| Package | level 1 | level 2 | level 3 | level 4 | level 5 | level 6 | Cardinality | Datatype Name |
|---|---|---|---|---|---|---|---|---|
| | | | | ID 367032 | | | 1 367034 | InspectionSubsetID 367036 |
| Operation 367038 | | | | Operation 367040 | | | 1 367042 | |
| | | | | | ID 367044 | | 1 367046 | MaterialInspectionSubsetOperationID 367048 |
| InspectionActivity 367050 | | | | | InspectionActivity 367052 | | 1 367054 | |
| | | | | | | ID 367056 | 1 367058 | MaterialInspectionSubsetOperationInspectionActivityID 367060 |

FIG. 367-3

| Package | level 1 | level 2 | level 3 | level 4 | level 5 | level 6 | Cardinality | Datatype Name |
|---|---|---|---|---|---|---|---|---|
| | | | | | | LifeCycleStatus Code 367062 | 1 367064 | InspectionActivityLifeCycleStatus-Code 367066 |
| | | | | | | LifeCycleStatus Name 367068 | 0..1 367070 | MEDIUM_Name 367072 |
| | | | | | | FindingReportedIndicator 367074 | 1 367076 | Indicator 367078 |
| Log 367080 | | Log 367082 | | | | | 1 367084 | Log 367086 |

FIG. 368-1

| Package | level 1 | level 2 | level 3 | level 4 | level 5 | level 6 | level 7 | Cardinality | Datatype Name |
|---|---|---|---|---|---|---|---|---|---|
| MaterialInspectionSubsetOperationInspectionActivityFinding-CreateRequestMessage 368000 | MaterialInspectionSubsetOperationInspectionActivityFindingCreateRequestMessage_sync 368002 | | | | | | | | MaterialInspectionSubsetOperationInspectionActivityFinding-CreateRequestMessage_sync 368004 |
| MessageHeader 368006 | | MessageHeader 368008 | | | | | | 0..1 368010 | BasicBusinessDocumentMessageHeader 368012 |
| MaterialInspection 368014 | | MaterialInspection 368016 | | | | | | 1 368018 | |

FIG. 368-2

| Package | level 1 | level 2 | level 3 | level 4 | level 5 | level 6 | level 7 | Cardinality | Datatype Name |
|---|---|---|---|---|---|---|---|---|---|
| | | | ID 368020 | | | | | 1 368022 | MaterialInspectionID 368024 |
| Subset 368026 | | | Subset 368028 | | | | | 1 368030 | |
| | | | | ID 368032 | | | | 1 368034 | Inspection-SubsetID 368036 |
| Operation 368038 | | | | Operation 368040 | | | | 1 368042 | |
| | | | | | ID 368044 | | | 1 368046 | MaterialInspectionSubsetOperationID 368048 |
| InspectionActivity 368050 | | | | | InspectionActivity 368052 | | | 1 368054 | |

FIG. 368-3

| Package | level 1 | level 2 | level 3 | level 4 | level 5 | level 6 | level 7 | Cardinality | Datatype Name |
|---|---|---|---|---|---|---|---|---|---|
| | | | | | | ID 368056 | | 1 368058 | MaterialInspectionSubsetOperationInspectionActivityID 368060 |
| Finding 368062 | | | | | | Finding 368064 | | 1 368066 | |
| | | | | | | | DefectTypeQualityIssueCategoryCatalogueID 368068 | 1 368070 | QualityIssueCategoryCatalogueID 368072 |
| | | | | | | | DefectTypeParentQualityIssueCategoryID 368074 | 1 368076 | QualityIssueCategoryID 368078 |

FIG. 368-4

| Package | level 1 | level 2 | level 3 | level 4 | level 5 | level 6 | level 7 | Cardinality | Datatype Name |
|---|---|---|---|---|---|---|---|---|---|
| | | | | | | | DefectTypeQualityIssueCategoryID 368080 | 1 368082 | QualityIssueCategoryID 368084 |
| | | | | | | | DefectLocationQualityIssueCategoryCatalogueID 368086 | 0..1 368088 | QualityIssueCategoryCatalogueID 368090 |
| | | | | | | | DefectLocationParentQualityIssueCategoryID 368092 | 0..1 368094 | QualityIssueCategoryID 368096 |
| | | | | | | | DefectLocationQualityIssueCategoryID 368098 | 0..1 3680100 | QualityIssueCategoryID 3680102 |

FIG. 368-5

| Package | level 1 | level 2 | level 3 | level 4 | level 5 | level 6 | level 7 | Cardinality | Datatype Name |
|---|---|---|---|---|---|---|---|---|---|
| | | | | | | | CauseQuali-tyIssue-Category-CatalogueID 3680104 | 0..1 3680106 | QualityIs-sueCate-goryCata-logueID 3680108 |
| | | | | | | | CausePar-entQualityIs-sueCate-goryID 3680110 | 0..1 3680112 | QualityIs-sueCate-goryID 3680114 |
| | | | | | | | CauseQuali-tyIssue-CategoryID 3680116 | 0..1 3680118 | QualityIs-sueCate-goryID 3680120 |
| | | | | | | | DefectNum-berValue 3680122 | 0..1 3680124 | NumberValue 3680126 |
| | | | | | | | Affected-Quantity 3680128 | 0..1 3680130 | Quantity 3680132 |

FIG. 368-6

| Package | level 1 | level 2 | level 3 | level 4 | level 5 | level 6 | level 7 | Cardinality | Datatype Name |
|---|---|---|---|---|---|---|---|---|---|
| | | | | | | | Description 3680134 | 0..1 3680136 | SHORT_Description 3680138 |
| | | | | | | | DefectClassCode 3680140 | 0..1 3680142 | DefectClassCode 3680144 |
| | | | | | | | DefectWeightingClassCode 3680146 | 0..1 3680148 | DefectWeightingClassCode 3680150 |
| | | | | | | | SystematicIndicator 3680152 | 0..1 3680154 | Indicator 3680156 |

FIG. 369-1

| Package | level 1 | level 2 | level 3 | level 4 | level 5 | level 6 | Cardinality | Datatype Name |
|---|---|---|---|---|---|---|---|---|
| MaterialInspectionSubsetOperationInspectionActivityResultRecordingConfirmationMessage 369000 | MaterialInspectionSubsetOperationInspectionActivityResultRecordingConfirmationMessage_sync 369002 | | | | | | | MaterialInspectionSubsetOperationInspectionActivityResultRecordingConfirmationMessage_sync 369004 |
| MessageHeader 369006 | | MessageHeader 369008 | | | | | 0..1 369010 | BasicBusinessDocumentMessageHeader 369012 |
| MaterialInspection 369014 | | MaterialInspection 369016 | | | | | 0..1 369018 | |
| | | | ID 369020 | | | | 1 369022 | MaterialInspectionID 369024 |

FIG. 369-2

| Package | level 1 | level 2 | level 3 | level 4 | level 5 | level 6 | Cardinality | Datatype Name |
|---|---|---|---|---|---|---|---|---|
| Subset 369026 | | | Subset 369028 | | | | 1 369030 | |
| | | | | ID 369032 | | | 1 369034 | InspectionSubsetID 369036 |
| Operation 369038 | | | | Operation 369040 | | | 1 369042 | |
| | | | | | ID 369044 | | 1 369046 | MaterialInspectionSubsetOperationID 369048 |
| InspectionActivity 369050 | | | | | InspectionActivity 369052 | | 1 369054 | |
| | | | | | | ID 369056 | 1 369058 | MaterialInspectionSubsetOperationInspectionActivityID 369060 |

FIG. 369-3

| Package | level 1 | level 2 | level 3 | level 4 | level 5 | level 6 | Cardinality | Datatype Name |
|---|---|---|---|---|---|---|---|---|
| | | | | | | LifeCycleS-tatusCode 369062 | 1 369064 | InspectionActiv-ityLifeCycleS-tatusCode 369066 |
| | | | | | | LifeCycleS-tatusName 369068 | 0..1 369070 | MEDIUM_Name 369072 |
| Log 369074 | | Log 369076 | | | | | 1 369078 | Log 369080 |

FIG. 370-1

| Package | level 1 | level 2 | level 3 | level 4 | level 5 | level 6 | level 7 | Cardinality | Datatype Name |
|---|---|---|---|---|---|---|---|---|---|
| MaterialInspectionSubsetOperationInspectionActivityResultRecordingRequestMessage 370000 | MaterialInspectionSubsetOperationInspectionActivityResultRecordingRequestMessage_sync 370002 | | | | | | | | MaterialInspectionSubsetOperationInspectionActivityResultRecordingRequestMessage_sync 370004 |
| MessageHeader 370006 | | Message Header 370008 | | | | | | 0..1 370010 | BasicBusinessDocumentMessageHeader 370012 |
| MaterialInspection 370014 | | MaterialInspection 370016 | | | | | | 1 370018 | |
| | | | ID 370020 | | | | | 1 370022 | MaterialInspectionID 370024 |

FIG. 370-2

| Package | level 1 | level 2 | level 3 | level 4 | level 5 | level 6 | level 7 | Cardinality | Datatype Name |
|---|---|---|---|---|---|---|---|---|---|
| | | | ChangeStateID 370026 | | | | | 1 370028 | ChangeStateID 370030 |
| Subset 370032 | | | Subset 370034 | | | | | 1 370036 | |
| | | | | ID 370038 | | | | 1 370040 | InspectionSubsetID 370042 |
| Operation 370044 | | | | Operation 370046 | | | | 1 370048 | |
| | | | | | ID 370050 | | | 1 370052 | MaterialInspectionSubsetOperationID 370054 |
| InspectionActivity 370056 | | | | | InspectionActivity 370058 | | | 1 370060 | |

FIG. 370-3

| Package | level 1 | level 2 | level 3 | level 4 | level 5 | level 6 | level 7 | Cardinality | Datatype Name |
|---|---|---|---|---|---|---|---|---|---|
| | | | | | | ID 370062 | | 1 370064 | MaterialInspectionSubsetOperationInspectionActivityID 370066 |
| | | | | | | ActualIndividualMaterialID 370068 | | 0..1 370070 | ProductID 370072 |
| Result 370074 | | | | | | Result 370076 | | 1..n 370078 | |
| | | | | | | | ID 370080 | 1 370082 | MaterialInspectionSubsetOperationInspectionActivityResultID 370084 |

FIG. 370-4

| Package | level 1 | level 2 | level 3 | level 4 | level 5 | level 6 | level 7 | Cardinality | Datatype Name |
|---|---|---|---|---|---|---|---|---|---|
| | | | | | | | Measure 370086 | 0..1 370088 | Measure 370090 |
| | | | | | | | Charac-teristicAt-tribute-QualityIs-sueCate-goryID 370092 | 0..1 370094 | QualityIs-sueCate-goryID 370096 |
| | | | | | | | Inspect-edNum-berValue 370098 | 0..1 3700100 | Number-Value 3700102 |
| | | | | | | | Defect-Number-Value 3700104 | 0..1 3700106 | Number-Value 3700108 |
| | | | | | | | Accep-tanceS-tatusCode 3700110 | 0..1 3700112 | Accep-tanceS-tatusCode 3700114 |

FIG. 370-5

| Package | level 1 | level 2 | level 3 | level 4 | level 5 | level 6 | level 7 | Cardinality | Datatype Name |
|---|---|---|---|---|---|---|---|---|---|
| | | | | | | | Excep-tionIndica-tor 3700116 | 0..1 3700118 | Indicator 3700120 |
| | | | | | | | Comment 3700122 | 0..1 3700124 | LANGUAGEINDEPENDENT_Comment 3700126 |
| | | | | | | | @action-Code 3700128 | 0..1 3700130 | ActionCode 3700132 |

FIG. 376-1

| Package | level 1 | level 2 | level 3 | Cardinality | Datatype Name |
|---|---|---|---|---|---|
| MaterialInspection SampleBy Elements QueryMessage 376000 | MaterialInspection SampleByElements QueryMessage 376002 | | | | MaterialInspection By ElementsQuery 376006 |
| Selection | | Material InspectionSample Selection ByElements 376010 | | 1 376012 | |
| | | | ID 376014 | 0..1 376016 | MaterialInspection SampleID 376020 |
| | | | SampleDrawing ProcedureID 376022 | 0..1 376024 | SampleDrawing ProcedureID 37600028 |
| | | | Material InspectionID 376030 | 0..1 376032 | Material InspectionID 376036 |
| | | | MaterialInternalID 376038 | 0..1 376040 | ProductInternalID 376044 |
| | | | PlantID 376044 | 0..1 376046 | PlantID 376050 |
| 376008 | | | BatchID 376052 | 0..1 376054 | BatchID 376058 |

FIG. 376-2

| Package | level 1 | level 2 | level 3 | Cardinality | Datatype Name |
|---|---|---|---|---|---|
| | | | SupplierID 376060 | 0..1 376062 | SupplierID 376066 |
| | | | TypeCode 376068 | 0..1 376070 | InspectionSample TypeCode 376074 |
| | | | CategoryCode 376076 | 0..1 376078 | InspectionSample CategoryCode 376082 |
| Processing Conditions 376084 | | Processing Conditions 376086 | | 1 | |
| | | | QueryHits Maximum NumberValue 376090 | 0..1 376092 | NumberValue 376096 |
| | | | UnlimitedQuery HitsIndicator 376098 | 0..1 3760100 | Indicator 3760104 |

FIG. 377-1

| Package | level 1 | level 2 | level 3 | Cardinality | Datatype Name |
|---|---|---|---|---|---|
| MaterialInspection SampleBy Elements ResponseMessage 377000 | MaterialInspection SampleBy Elements Response Message 377002 | | | | MaterialInspection SampleBy ElementsResponse 377006 |
| Material Inspection Sample | | MaterialInspection Sample 377010 | | 0..n 377012 | |
| | | | ID 377014 | 1 377016 | MaterialInspectionSampleID 377020 |
| | | | System Administrative Data 377022 | 1 377024 | System AdministrativeData 377028 |
| | | | StatusObject 377030 | 1 377032 | StatusObject 377036 |
| | | | MaterialInternalID 377038 | 0..1 377040 | ProductInternalID 377044 |
| 377008 | | | Material Description 377046 | 0..1 377048 | SHORT_ Description 377052 |

FIG. 377-2

| Package | level 1 | level 2 | level 3 | Cardinality | Datatype Name |
|---|---|---|---|---|---|
| | | | SupplierID 377054 | 0..1 377056 | SupplierID 377060 |
| | | | SupplierFormattedName 377062 | 0..1 377064 | LONG_Name 377068 |
| | | | SampleDrawingProcedureID 377070 | 0..1 377072 | SampleDrawingProcedureID 377076 |
| | | | SampleTakerGivenName 377078 | 0..1 377080 | Name 377084 |
| | | | SampleDrawingDateTime 377086 | 0..1 377088 | TIMEZONEINDEPENDENT_DateTime 377092 |
| | | | Processor PersonName 377094 | 0..1 377096 | PersonName 3770100 |
| | | | TypeCode 3770102 | 1 3770104 | InspectionSample TypeCode 3770108 |
| | | | TypeName 3770110 | 0..1 3770112 | MEDIUM_Name 3770116 |
| | | | CategoryCode 3770118 | 1 3770120 | InspectionSample CategoryCode 3770124 |

FIG. 377-3

| Package | level 1 | level 2 | level 3 | Cardinality | Datatype Name |
|---|---|---|---|---|---|
| | | | CategoryName 3770126 | 0..1 3770128 | MEDIUM_Name 3770132 |
| | | | Inspection Container TypeCode 3770134 | 1 3770136 | InspectionContainerTypeCode 3770140 |
| | | | Inspection Container TypeName 3770142 | 0..1 3770144 | MEDIUM_Name 3770148 |
| | | | Quantity 3770150 | 1 3770152 | Quantity 3770156 |
| | | | Description 3770158 | 0..1 3770160 | Medium_ Description 3770164 |
| | | | WorkCentreID 3770166 | 0..1 3770168 | WorkCentreID 3770172 |
| | | | WorkCentre Description 3770174 | 0..1 3770176 | SHORT_ Description 3770180 |
| ProcessingConditions | | Processing Conditions 3770184 | | 1 3770186 | |

FIG. 377-4

| Package | level 1 | level 2 | level 3 | Cardinality | Datatype Name |
|---|---|---|---|---|---|
| 3770182 | | | RetumedQueryHitsNumberValue 3770190 | 1 3770192 | NumberValue 3770196 |
| | | | MoreElementsAvailableIndicator 3770198 | 1 3770200 | Indicator 3770204 |
| 3770206 | | Log 3770208 | | 1 3770210 | Log 3770214 |

FIG. 378

| Package | level 1 | level 2 | level 3 | Cardinality | Datatype Name |
|---|---|---|---|---|---|
| MaterialInspection SampleCreate ConfirmationMessage 378000 | MaterialInspection Sample Create Confirmation Message 378002 | | | | MaterialInspectionSample CreateConfirmation 378006 |
| MessageHeader YHCAA08 | | MessageHeader 378010 | | 0..1 378012 | BasicBusinessDocument MessageHeader 378016 |
| | | | ID 378018 | 0..1 378020 | BusinessDocumentMessageID 378024 |
| | | | ReferenceID 378026 | 0..1 378028 | BusinessDocumentMessageID 378032 |
| | | | UUID 378034 | 0..1 378036 | ATTRIBUTEINDEPENDENT _UUID 378040 |
| | | | ReferenceUUID 378042 | 0..1 378044 | ATTRIBUTEINDEPENDENT _UUID 378048 |
| MaterialInspection Sample 378050 | | MaterialInspection Sample 378052 | | 0..1 378054 | |
| | | | ID 378058 | 1 378060 | MaterialInspectionSampleID 378064 |
| | | | StatusObject 378052 | 0..1 378054 | StatusObject 378058 |
| Log 378060 | | Log 378062 | | 1 378064 | Log 378068 |

FIG. 379-1

| Package | level 1 | level 2 | level 3 | Cardinality | Datatype Name |
|---|---|---|---|---|---|
| MaterialInspection Sample CreateRequest Message 379000 | MaterialInspection SampleCreate RequestMessage 379002 | | | | MaterialInspection SampleCreate Request 379006 |
| MessageHeader 379008 | | Message Header 379010 | | 0..1 379012 | BasicBusinessDocument MessageHeader 379016 |
| | | | ID 379018 | 0..1 379020 | BusinessDocument MessageID 379024 |
| | | | ReferenceID 379026 | 0..1 379028 | BusinessDocument MessageID 379032 |
| | | | UUID 379034 | 0..1 379036 | ATTRIBUTEINDEPENDENT_ UUID 379040 |
| | | | ReferenceUUID 379042 | 0..1 379044 | ATTRIBUTEINDEPENDENT_ UUID 379048 |
| MaterialInspection Sample 379050 | | Material Inspection Sample 379052 | | 1 379054 | |
| | | | ID 379058 | 0..1 379060 | MaterialInspectionSampleID 379064 |

FIG. 379-2

| Package | level 1 | level 2 | level 3 | Cardinality | Datatype Name |
|---|---|---|---|---|---|
| | | | Material InspectionID 379066 | 0..1 379068 | MaterialInspectionID 379072 |
| | | | MaterialInspection SubsetOperationID 379074 | 0..1 379076 | MaterialInspectionSubset OperationID 379080 |
| | | | MaterialInternalID 379082 | 0..1 379084 | ProductInternalID 379088 |
| | | | PlantID 379090 | 0..1 379092 | PlantID 379096 |
| | | | BatchID 379098 | 0..1 3790100 | BatchID 3790104 |
| | | | SupplierID 3790106 | 0..1 3790108 | SupplierID 3790112 |
| | | | SampleDrawing ProcedureID 3790114 | 0..1 3790116 | SampleDrawingProcedureID 3790120 |
| | | | SampleTakerGivenName 3790122 | 0..1 3790124 | Name 3790128 |
| | | | SampleDrawing DateTime 3790130 | 0..1 3790132 | TIMEZONEINDEPENDENT_ DateTime 3790136 |
| | | | TypeCode 3790138 | 1 3790140 | InspectionSampleTypeCode 3790144 |

FIG. 379-3

| Package | level 1 | level 2 | level 3 | Cardinality | Datatype Name |
|---|---|---|---|---|---|
| | | | CategoryCode 3790146 | 1 3790148 | InspectionSampleCategory Code 3790152 |
| | | | Inspection Container TypeCode 3790154 | 1 3790156 | InspectionContainer TypeCode 3790160 |
| | | | Quantity 3790162 | 1 3790164 | Quantity 3790168 |
| | | | Description 3790170 | 0..1 3790172 | Medium_Description 3790176 |
| | | | WorkCentreID 3790178 | 0..1 3790180 | WorkCentreID 3790184 |

FIG. 398-1

| Package | level 1 | level 2 | level 3 | level 4 | Cardinality | Datatype Name |
|---|---|---|---|---|---|---|
| ProcurementPlanningOrderByElementsQueryMessage_sync 398000 | ProcurementPlanningOrderByElementsQueryMessage_sync 398002 | | | | | ProcurementPlanningOrderByElementsQueryMessage_sync 398004 |
| MessageHeader 398006 | | MessageHeader 398008 | | | 1..1 398010 | BusinessDocumentMessageHeader 398012 |
| | | | ID 398014 | | 1..1 398016 | BusinessDocumentMessageID 398018 |
| | | | ReferenceID 398020 | | 0..1 398022 | BusinessDocumentMessageID 398024 |

FIG. 398-2

| Package | level 1 | level 2 | level 3 | level 4 | Cardinality | Datatype Name |
|---|---|---|---|---|---|---|
| | | | Creation-DateTime 398026 | | 1..1 398028 | GLOBAL_DateTime 398030 |
| | | | TestDataIndicator 398032 | | 0..1 398034 | Indicator 398036 |
| | | | Reconciliation-Indicator 398038 | | 0..1 398040 | Indicator 398042 |
| | | | SenderParty 398044 | | 0..1 398046 | Business-Document-Message-HeaderParty 398048 |
| | | | | InternalID 398050 | 0..1 398052 | PartyInternalID 398054 |
| | | | | StandardID 398056 | 0..n 398058 | PartyStandardID 398060 |

FIG. 398-3

| Package | level 1 | level 2 | level 3 | level 4 | Cardinality | Datatype Name |
|---|---|---|---|---|---|---|
| | | | | ContactPer-son 398062 | 0..1 398064 | Business-Document-Message-HeaderPar-tyContact-Person 398066 |
| | | | RecipientParty 398068 | | 0..n 398070 | Business-Document-Message-HeaderParty 398072 |
| | | | | InternalID 398074 | 0..1 398076 | PartyInter-nalID 398078 |
| | | | | StandardID 398080 | 0..n 398082 | PartyStan-dardID 398084 |

FIG. 398-4

| Package | level 1 | level 2 | level 3 | level 4 | Cardinality | Datatype Name |
|---|---|---|---|---|---|---|
| | | | | ContactPerson 398086 | 0..1 398088 | Business-Document-Message-HeaderPartyContact-Person 398090 |
| | | | BusinessScopeBusinessProcess 398092 | | 0..1 398094 | BusinessScopeBusinessProcess 398096 |
| | | | | TypeCode 398098 | 1..1 3980100 | BusinessScopeBusinessProcessTypeCode 3980102 |
| | | | | InstanceID 3980104 | 0..1 3980106 | BusinessScopeBusinessProcessInstanceID 3980108 |

FIG. 398-5

| Package | level 1 | level 2 | level 3 | level 4 | Cardinality | Datatype Name |
|---|---|---|---|---|---|---|
| | | | | ID 3980110 | 0..1 3980112 | BusinessScopeBusinessProcessID 3980114 |
| Selection 3980116 | | ProcurementPlanningOrderSelectionByElements 3980118 | | | 1..1 3980120 | |
| | | | PlanningVersionID 3980122 | | 1..1 3980124 | PlanningVersionID 3980126 |
| | | | SelectionByItemProductInternalID 3980128 | | 0..n 3980130 | |
| | | | | InclusionExclusionCode 3980132 | 0..1 3980134 | InclusionExclusionCode 3980136 |

FIG. 398-6

| Package | level 1 | level 2 | level 3 | level 4 | Cardinality | Datatype Name |
|---|---|---|---|---|---|---|
| | | | | IntervalBoundaryTypeCode 3980138 | 1..1 3980140 | IntervalBoundaryTypeCode 3980142 |
| | | | | LowerBoundaryProductInternalID 3980144 | 0..1 3980146 | ProductInternalID 3980148 |
| | | | | UpperBoundaryProductInternalID 3980150 | 0..1 3980152 | ProductInternalID 3980154 |
| | | | SelectionByItemLocationInternalID 3980156 | | 0..n 3980158 | |
| | | | | InclusionExclusionCode 3980160 | 0..1 3980162 | InclusionExclusionCode 3980164 |

FIG. 398-7

| Package | level 1 | level 2 | level 3 | level 4 | Cardinality | Datatype Name |
|---|---|---|---|---|---|---|
| | | | | IntervalBoundaryTypeCode 3980166 | 1..1 3980168 | IntervalBoundaryTypeCode 3980170 |
| | | | | LowerBoundaryLocationInternalID 3980172 | 0..1 3980174 | LocationInternalID 3980176 |
| | | | | UpperBoundaryLocationInternalID 3980178 | 0..1 3980180 | LocationInternalID 3980182 |
| | | | ItemScheduleLineAvailabilityDateTimePeriod 3980184 | | 0..1 3980186 | UPPEROPEN_GLOBAL_DateTimePeriod 3980188 |
| | | | | StartDateTime 3980190 | 0..1 3980192 | DateTime 3980194 |

FIG. 398-8

| Package | level 1 | level 2 | level 3 | level 4 | Cardinality | Datatype Name |
|---|---|---|---|---|---|---|
| | | | | EndDateTime 3980196 | 0..1 3980198 | DateTime 3980200 |
| | | | ItemScheduleLineFixedIndicator 3980202 | | 0..1 3980204 | Indicator 3980206 |
| | | | SelectionOffsetNumber 3980208 | | 0..1 3980210 | NumberValue 3980212 |
| | | | MaximumNumberValue 3980214 | | 0..1 3980216 | NumberValue 3980218 |

FIG. 399-1

| Package | level 1 | level 2 | level 3 | level 4 | level 5 | Cardinality | Datatype Name |
|---|---|---|---|---|---|---|---|
| ProcurementPlanningOrderByElementsResponseMessage_sync 399000 | ProcurementPlanningOrderByElementsResponseMessage_sync 399002 | | | | | | ProcurementPlanningOrderByElementsResponseMessage_sync 399004 |
| MessageHeader 399006 | | MessageHeader 399008 | | | | 1..1 399010 | BasicBusinessDocumentMessageHeader 399012 |
| | | | ID 399014 | | | 0..1 399016 | BusinessDocumentMessageID 399018 |
| | | | UUID 399020 | | | 0..1 399022 | ATTRIBUTEINDEPENDENT_UUID 399024 |

FIG. 399-2

| Package | level 1 | level 2 | level 3 | level 4 | level 5 | Cardinality | Datatype Name |
|---|---|---|---|---|---|---|---|
| | | | ReferenceID 399026 | | | 0..1 399028 | Business-Document-MessageID 399030 |
| | | | Refer-enceUUID 399032 | | | 0..1 399034 | ATTRIBUTEINDEPENDENT_UUID 399036 |
| Procurement-PlanningOrder 399038 | | Procure-mentPlannin-gOrder 399040 | | | | 0..n 399042 | |
| | | | ID 399044 | | | 1..1 399046 | Procure-mentPlannin-gOrderID 399048 |
| | | | PlanningVer-sionID 399050 | | | 1..1 399052 | PlanningVer-sionID 399054 |

FIG. 399-3

| Package | level 1 | level 2 | level 3 | level 4 | level 5 | Cardinality | Datatype Name |
|---|---|---|---|---|---|---|---|
| Procurement-PlanningOrde-rItem 399056 | | | Procurement-PlanningOrde-rItem 399058 | | | 1..1 399060 | |
| | | | | Product-InternalID 399062 | | 1..1 399064 | ProductInter-nalID 399066 |
| | | | | LocationIn-ternalID 399068 | | 1..1 399070 | LocationIn-ternalID 399072 |
| Procure-mentPlan-ningOrde-rItemSched uleLine 399074 | | | | Procure-mentPlan-ningOrde-rItemSched-uleLine 399076 | | 1..1 399078 | |
| | | | | | Quantity 399080 | 1..1 399082 | Quantity 399084 |

FIG. 399-4

| Package | level 1 | level 2 | level 3 | level 4 | level 5 | Cardinality | Datatype Name |
|---|---|---|---|---|---|---|---|
| | | | | | Availability-DateTime 399086 | 1..1 399088 | GLOBAL_DateTime 399090 |
| | | | | | FixedIndicator 399092 | 1..1 399094 | Indicator 399096 |
| | | | | | GoodsReceiptDuration 399098 | 1..1 3990100 | Duration 3990102 |
| | | | | | GoodsReceiptCapacity 3990104 | 0..1 3990106 | Quantity 3990108 |
| | | | | | GoodsReceiptResourceID 3990110 | 0..1 3990112 | ResourceID 3990114 |

FIG. 399-5

| Package | level 1 | level 2 | level 3 | level 4 | level 5 | Cardinality | Datatype Name |
|---|---|---|---|---|---|---|---|
| | | | | | Delivery-DateTime 3990116 | 1..1 3990118 | GLOBAL_DateTime 3990120 |
| Log 3990122 | | Log 3990124 | | | | 1..1 3990126 | Log 3990128 |
| | | | Business-Document-Processin-gResultCode 3990130 | | | 0..1 3990132 | Processin-gResultCode 3990134 |
| | | | Maximum-LogItemSever-ityCode 3990136 | | | 0..1 3990138 | LogItem-SeverityCode 3990140 |
| | | | Item 3990142 | | | 0..n 3990144 | LogItem 3990146 |

FIG. 400-1

| Package | level 1 | level 2 | level 3 | level 4 | Cardinality | Datatype Name |
|---|---|---|---|---|---|---|
| Procurement-PlanningOrderBy-IDQueryMes-sage_sync 400000 | ProcurementPlan-ningOrderByIDQue-ryMessage_sync 400002 | | | | | Procurement-PlanningOrder-ByIDQueryMes-sage_sync 400004 |
| Message-Header 400006 | | MessageHeader 400008 | | | 1..1 400010 | BusinessDocu-mentMessage-Header 400012 |
| | | | ID 400014 | | 1 400016 | BusinessDocu-mentMessageID 400018 |
| | | | ReferenceID 400020 | | 0..1 400022 | BusinessDocu-mentMessageID 400024 |
| | | | Creation-DateTime 400026 | | 1 400028 | GLOBAL_DateTi me 400030 |
| | | | TestDataIndi-cator 400032 | | 0..1 400034 | Indicator 400036 |

FIG. 400-2

| Package | level 1 | level 2 | level 3 | level 4 | Cardinality | Datatype Name |
|---|---|---|---|---|---|---|
| | | | Reconciliation-Indicator 400038 | | 0..1 400040 | Indicator 400042 |
| | | | SenderParty 400044 | | 0..1 400046 | BusinessDocu-mentMessage-HeaderParty 400048 |
| | | | | InternalID 400050 | 0..1 400052 | PartyInternalID 400054 |
| | | | | StandardID 400056 | 0..n 400058 | PartyStandardID 400060 |
| | | | | ContactPerson 400062 | 0..1 400064 | BusinessDocu-mentMessage-HeaderParty-ContactPerson 400066 |
| | | | RecipientParty 400068 | | 0..n 400070 | BusinessDocu-mentMessage-HeaderParty 400072 |

FIG. 400-3

| Package | level 1 | level 2 | level 3 | level 4 | Cardinality | Datatype Name |
|---|---|---|---|---|---|---|
| | | | | InternalID 400074 | 0..1 400076 | PartyInternalID 400078 |
| | | | | StandardID 400080 | 0..n 400082 | PartyStandardID 400084 |
| | | | | ContactPerson 400086 | 0..1 400088 | BusinessDocumentMessageHeaderParty-ContactPerson 400090 |
| | | | BusinessScopeBusinessProcess 400092 | | 0..1 400094 | BusinessScope-BusinessProcess 400096 |
| | | | | TypeCode 400098 | 1 4000100 | BusinessScope-BusinessProcessTypeCode 4000102 |
| | | | | InstanceID 4000104 | 0..1 4000106 | BusinessScope-BusinessProcessInstanceID 4000108 |

FIG. 400-4

| Package | level 1 | level 2 | level 3 | level 4 | Cardinality | Datatype Name |
|---|---|---|---|---|---|---|
| | | | | ID 4000110 | 0..1 4000112 | BusinessScope-BusinessProces-sID 4000114 |
| Selection 4000116 | | Procurement-PlanningOrder-SelectionByID 4000118 | | | 1..1 4000120 | |
| | | | Procurement-PlanningOrde-rID 4000122 | | 1..1 4000124 | Procurement-PlanningOrderID 4000126 |

FIG. 401-1

| Package | level 1 | level 2 | level 3 | level 4 | level 5 | Cardinality | Datatype Name |
|---|---|---|---|---|---|---|---|
| ProcurementPlanningOrderByIDResponseMessage_sync 401000 | ProcurementPlanningOrderByIDResponseMessage_sync 401002 | | | | | | ProcurementPlanningOrderByIDResponseMessage_sync 401004 |
| MessageHeader 401006 | | MessageHeader 401008 | | | | 1..1 401010 | BasicBusinessDocumentMessageHeader 401012 |
| | | | ID 401014 | | | 0..1 401016 | BusinessDocumentMessageID 401018 |
| | | | UUID 401020 | | | 0..1 401022 | ATTRIBUTEINDEPENDENT_UUID 401024 |

FIG. 401-2

| Package | level 1 | level 2 | level 3 | level 4 | level 5 | Cardinality | Datatype Name |
|---|---|---|---|---|---|---|---|
| | | | ReferenceID 401026 | | | 0..1 401028 | Business-Document-MessageID 401030 |
| | | | ReferenceUUID 401032 | | | 0..1 401034 | ATTRIBUTEINDEPENDENT_UUID 401036 |
| Procurement-PlanningOrder 401038 | | Procurement-PlanningOrder 401040 | | | | 0..1 401042 | |
| | | | ID 401044 | | | 1..1 401046 | Procure-mentPlannin-gOrderID 401048 |
| | | | PlanningVer-sionID 401050 | | | 1..1 401052 | PlanningVer-sionID 401054 |

FIG. 401-3

| Package | level 1 | level 2 | level 3 | level 4 | level 5 | Cardinality | Datatype Name |
|---|---|---|---|---|---|---|---|
| Procure-mentPlannin-gOrderItem 401056 | | | Procurement-PlanningOrde-rItem 401058 | | | 1..1 401060 | |
| | | | | ProductInter-nalID 401062 | | 1..1 401064 | ProductInter-nalID 401066 |
| | | | | LocationInter-nalID 401068 | | 1..1 401070 | LocationIn-ternalID 401072 |
| Procure-mentPlan-ningOrde-rItemSched uleLine 401074 | | | | Procurement-PlanningOrde-rItemSched-uleLine 401076 | | 1..1 401078 | |
| | | | | | Quantity 401080 | 1..1 401082 | Quantity 401084 |
| | | | | | Availability-DateTime 401086 | 1..1 401088 | GLOBAL_Dat eTime 401090 |

FIG. 401-4

| Package | level 1 | level 2 | level 3 | level 4 | level 5 | Cardinality | Datatype Name |
|---|---|---|---|---|---|---|---|
| | | | | | FixedIndicator 401092 | 1..1 401094 | Indicator 401096 |
| | | | | | GoodsReceiptDuration 401098 | 1..1 4010100 | Duration 4010102 |
| | | | | | GoodsReceiptCapacity 4010104 | 0..1 4010106 | Quantity 4010108 |
| | | | | | GoodsReceiptResourceID 4010110 | 0..1 4010112 | ResourceID 4010114 |
| | | | | | Delivery-DateTime 4010116 | 1..1 4010118 | GLOBAL_DateTime 4010120 |
| Log 4010122 | | Log 4010124 | | | | 1..1 4010126 | Log 4010128 |

FIG. 401-5

| Package | level 1 | level 2 | level 3 | level 4 | level 5 | Cardinality | Datatype Name |
|---|---|---|---|---|---|---|---|
| | | | BusinessDocumentProcessingResultCode 4010130 | | | 0..1 4010132 | ProcessingResultCode 4010134 |
| | | | Maximum-LogItemSeverityCode 4010136 | | | 0..1 4010138 | LogItem-SeverityCode 4010140 |
| | | | Item 4010142 | | | 0..n 4010144 | LogItem 4010146 |

FIG. 402-1

| Package | level 1 | level 2 | level 3 | Cardinality | Datatype Name |
|---|---|---|---|---|---|
| ProcurementPlanningOrderCancelConfirmationMessage_sync 402000 | ProcurementPlanningOrderCancelConfirmationMessage_sync 402002 | | | | ProcurementPlanningOrderCancelConfirmationMessage_sync 402004 |
| MessageHeader 402006 | | MessageHeader 402008 | | 1..1 402010 | BasicBusinessDocumentMessageHeader 402012 |
| | | | ID 402014 | 0..1 402016 | BusinessDocumentMessageID 402018 |
| | | | UUID 402020 | 0..1 402022 | ATTRIBUTEINDEPENDENT_UUID 402024 |
| | | | ReferenceID 402026 | 0..1 402028 | BusinessDocumentMessageID 402030 |
| | | | ReferenceUUID 402032 | 0..1 402034 | ATTRIBUTEINDEPENDENT_UUID 402036 |

FIG. 402-2

| Package | level 1 | level 2 | level 3 | Cardinality | Datatype Name |
|---|---|---|---|---|---|
| Procurement-PlanningOrder 402038 | | Procurement-PlanningOrder 402040 | | 0..1 402042 | |
| | | | ID 402044 | 1..1 402046 | ProcurementPlan-ningOrderID 402048 |
| Log 402050 | | Log 402052 | | 1..1 402054 | Log 402056 |
| | | | BusinessDocu-mentProcessin-gResultCode 402058 | 0..1 402060 | ProcessingResult-Code 402062 |
| | | | MaximumLogItem-SeverityCode 402064 | 0..1 402066 | LogItemSeverity-Code 402068 |
| | | | Item 402070 | 0..n 402072 | LogItem 402074 |

FIG. 403-1

| Package | level 1 | level 2 | level 3 | level 4 | Cardinality | Datatype Name |
|---|---|---|---|---|---|---|
| ProcurementPlanningOrderCancelRequestMessage_sync 403000 | ProcurementPlanningOrderCancelRequestMessage_sync 403002 | | | | | ProcurementPlanningOrderCancelRequestMessage_sync 403004 |
| MessageHeader 403006 | | MessageHeader 403008 | | | 1..1 403010 | BusinessDocumentMessageHeader 403012 |
| | | | ID 403014 | | 1 403016 | BusinessDocumentMessageID 403018 |
| | | | ReferenceID 403020 | | 0..1 403022 | BusinessDocumentMessageID 403024 |
| | | | CreationDateTime 403026 | | 1 403028 | GLOBAL_DateTime 403030 |
| | | | TestDataIndicator 403032 | | 0..1 403034 | Indicator 403036 |

FIG. 403-2

| Package | level 1 | level 2 | level 3 | level 4 | Cardinality | Datatype Name |
|---|---|---|---|---|---|---|
| | | | Reconciliation-Indicator 403038 | | 0..1 403040 | Indicator 403042 |
| | | | SenderParty 403044 | | 0..1 403046 | BusinessDocumentMessage-HeaderParty 403048 |
| | | | | InternalID 403050 | 0..1 403052 | PartyInternalID 403054 |
| | | | | StandardID 403056 | 0..n 403058 | PartyStandardID 403060 |
| | | | | ContactPerson 403062 | 0..1 403064 | BusinessDocumentMessage-HeaderPartyContactPerson 403066 |
| | | | RecipientParty 403068 | | 0..n 403070 | BusinessDocumentMessage-HeaderParty 403072 |

FIG. 403-3

| Package | level 1 | level 2 | level 3 | level 4 | Cardinality | Datatype Name |
|---|---|---|---|---|---|---|
| | | | | InternalID 403074 | 0..1 403076 | PartyInternalID 403078 |
| | | | | StandardID 403080 | 0..n 403082 | PartyStandardID 403084 |
| | | | | ContactPer-son 403086 | 0..1 403088 | BusinessDocu-mentMessage-HeaderPartyCon-tactPerson 403090 |
| | | | BusinessS-copeBusi-nessProcess 403092 | | 0..1 403094 | BusinessScope-BusinessProcess 403096 |
| | | | | TypeCode 403098 | 1 4030100 | BusinessScope-BusinessProc-essTypeCode 4030102 |

FIG. 403-4

| Package | level 1 | level 2 | level 3 | level 4 | Cardinality | Datatype Name |
|---|---|---|---|---|---|---|
| | | | | InstanceID 4030104 | 0..1 4030106 | BusinessScope-BusinessProc-essInstanceID 4030108 |
| | | | | ID 4030110 | 0..1 4030112 | BusinessScope-BusinessProces-sID 4030114 |
| Procurement-PlanningOrder 4030116 | | Procurement-PlanningOrder 4030118 | | | 1..1 4030120 | |
| | | | ID 4030122 | | 1..1 4030124 | Procurement-PlanningOrderID 4030126 |

FIG. 404-1

| Package | level 1 | level 2 | level 3 | Cardinality | Datatype Name |
|---|---|---|---|---|---|
| ProcurementPlanningOrderChangeConfirmationMessage_sync 404000 | ProcurementPlanningOrderChangeConfirmationMessage_sync 404002 | | | | ProcurementPlanningOrderChangeConfirmationMessage_sync 404004 |
| MessageHeader 404006 | | MessageHeader 404008 | | 1..1 404010 | BasicBusinessDocumentMessageHeader 404012 |
| | | | ID 404014 | 0..1 404016 | BusinessDocumentMessageID 404018 |
| | | | UUID 404020 | 0..1 404022 | ATTRIBUTEINDEPENDENT_UUID 404024 |
| | | | ReferenceID 404026 | 0..1 404028 | BusinessDocumentMessageID 404030 |

FIG. 404-2

| Package | level 1 | level 2 | level 3 | Cardinality | Datatype Name |
|---|---|---|---|---|---|
| | | | ReferenceUUID 404032 | 0..1 404034 | ATTRIBUTEINDEPENDENT_UUID 404036 |
| Procure-mentPlan-ningOrder 404038 | | Procurement-PlanningOrder 404040 | | 0..1 404042 | |
| | | | ID 404044 | 1..1 404046 | ProcurementPlan-ningOrderID 404048 |
| Log 404050 | | Log 404052 | | 1..1 404054 | Log 404056 |
| | | | BusinessDocu-mentProcessin-gResultCode 404058 | 0..1 404060 | ProcessingResult-Code 404062 |
| | | | MaximumLogItem-SeverityCode 404064 | 0..1 404066 | LogItemSeverity-Code 404068 |
| | | | Item 404070 | 0..n 404072 | LogItem 404074 |

FIG. 405-1

| Package | level 1 | level 2 | level 3 | level 4 | level 5 | Cardinality | Datatype Name |
|---|---|---|---|---|---|---|---|
| ProcurementPlanningOrder-ChangeRequest-Message_sync 405000 | Procurement-PlanningOrderChangeRequestMessage_sync 405002 | | | | | | Procurement-PlanningOrder-ChangeRequestMessage_sync 405004 |
| MessageHeader 405006 | | Message-Header 405008 | | | | 1..1 405010 | BusinessDocumentMessage-Header 405012 |
| | | | ID 405014 | | | 1 405016 | BusinessDocumentMessageID 405018 |
| | | | ReferenceID 405020 | | | 0..1 405022 | BusinessDocumentMessageID 405024 |
| | | | Creation-DateTime 405026 | | | 1 405028 | GLOBAL_DateTime 405030 |

FIG. 405-2

| Package | level 1 | level 2 | level 3 | level 4 | level 5 | Cardinality | Datatype Name |
|---|---|---|---|---|---|---|---|
| | | | TestDataIndicator 405032 | | | 0..1 405034 | Indicator 405036 |
| | | | ReconciliationIndicator 405038 | | | 0..1 405040 | Indicator 405042 |
| | | | SenderParty 405044 | | | 0..1 405046 | BusinessDocumentMessageHeaderParty 405048 |
| | | | | InternalID 405050 | | 0..1 405052 | PartyInternalID 405054 |
| | | | | StandardID 405056 | | 0..n 405058 | PartyStandardID 405060 |
| | | | | ContactPerson 405062 | | 0..1 405064 | BusinessDocumentMessageHeaderPartyContactPerson 405066 |

FIG. 405-3

| Package | level 1 | level 2 | level 3 | level 4 | level 5 | Cardinality | Datatype Name |
|---|---|---|---|---|---|---|---|
| | | | Recipient-Party 405068 | | | 0..n 405070 | BusinessDocumentMessage-HeaderParty 405072 |
| | | | | InternalID 405074 | | 0..1 405076 | PartyInternalID 405078 |
| | | | | StandardID 405080 | | 0..n 405082 | PartyStandardID 405084 |
| | | | | ContactPerson 405086 | | 0..1 405088 | BusinessDocumentMessage-HeaderParty-ContactPerson 405090 |
| | | | BusinessScopeBusinessProcess 405092 | | | 0..1 405094 | BusinessScopeBusinessProcess 405096 |

FIG. 405-4

| Package | level 1 | level 2 | level 3 | level 4 | level 5 | Cardinality | Datatype Name |
|---|---|---|---|---|---|---|---|
| | | | | TypeCode 405098 | | 1 4050100 | BusinessScopeBusinessProcessTypeCode 4050102 |
| | | | | InstanceID 4050104 | | 0..1 4050106 | BusinessScopeBusinessProcessInstanceID 4050108 |
| | | | | ID 4050110 | | 0..1 4050112 | BusinessScopeBusinessProcessID 4050114 |
| ProcurementPlanningOrder 4050116 | | ProcurementPlanningOrder 4050118 | | | | 1..1 4050120 | |
| | | | ID 4050122 | | | 1..1 4050124 | ProcurementPlanningOrderID 4050126 |

FIG. 405-5

| Package | level 1 | level 2 | level 3 | level 4 | level 5 | Cardinality | Datatype Name |
|---|---|---|---|---|---|---|---|
| Procurement-PlanningOrde-rItem 4050128 | | | Procure-mentPlannin-gOrderItem 4050130 | | | 1..1 4050132 | |
| Procure-mentPlan-ningOrde-rItemSched uleLine 4050134 | | | | Procure-mentPlannin-gOrderItem-ScheduleLine 4050136 | | 1..1 4050138 | |
| | | | | | Quantity 4050140 | 0..1 4050142 | Quantity 4050144 |
| | | | | | Availability-DateTime 4050146 | 0..1 4050148 | GLOBAL_DateT ime 4050150 |
| | | | | | FixedIndica-tor 4050152 | 0..1 4050154 | Indicator 4050156 |

FIG. 406-1

| Package | level 1 | level 2 | level 3 | Cardinality | Datatype Name |
|---|---|---|---|---|---|
| ProcurementPlanningOrderCreateConfirmationMessage_sync 406000 | ProcurementPlanningOrderCreateConfirmationMessage_sync 406002 | | | | ProcurementPlanningOrderCreateConfirmationMessage_sync 406004 |
| MessageHeader 406006 | | MessageHeader 406008 | | 1..1 406010 | BasicBusinessDocumentMessageHeader 406012 |
| | | | ID 406014 | 0..1 406016 | BusinessDocumentMessageID 406018 |
| | | | UUID 406020 | 0..1 406022 | ATTRIBUTEINDEPENDENT_UUID 406024 |
| | | | ReferenceID 406026 | 0..1 406028 | BusinessDocumentMessageID 406030 |

FIG. 406-2

| Package | level 1 | level 2 | level 3 | Cardinality | Datatype Name |
|---|---|---|---|---|---|
| | | | ReferenceUUID 406032 | 0..1 406034 | ATTRIBUTEINDEPENDENT_UUID 406036 |
| Procurement-PlanningOrder 406038 | | ProcurementPlanningOrder 406040 | | 0..1 406042 | |
| | | | ID 406044 | 1..1 406046 | ProcurementPlanningOrderID 406048 |
| Log 406050 | | Log 406052 | | 1..1 406054 | Log 406056 |
| | | | BusinessDocument-ProcessingResultCode 406058 | 0..1 406060 | ProcessingResultCode 406062 |
| | | | MaximumLogItem-SeverityCode 406064 | 0..1 406066 | LogItemSeverityCode 406068 |
| | | | Item 406070 | 0..n 406072 | LogItem 406074 |

FIG. 407-1

| Package | level 1 | level 2 | level 3 | level 4 | level 5 | Cardinality | Datatype Name |
|---|---|---|---|---|---|---|---|
| ProcurementPlanningOrderCreateRequestMessage_sync 407000 | ProcurementPlanningOrderCreateRequestMessage_sync 407002 | | | | | | ProcurementPlanningOrderCreateRequestMessage_sync 407004 |
| MessageHeader 407006 | | MessageHeader 407008 | | | | 1..1 407010 | BusinessDocumentMessageHeader 407012 |
| | | | ID 407014 | | | 1..1 407016 | BusinessDocumentMessageID 407018 |
| | | | ReferenceID 407020 | | | 0..1 407022 | BusinessDocumentMessageID 407024 |
| | | | CreationDateTime 407026 | | | 1..1 407028 | GLOBAL_Date Time 407030 |

FIG. 407-2

| Package | level 1 | level 2 | level 3 | level 4 | level 5 | Cardinality | Datatype Name |
|---|---|---|---|---|---|---|---|
| | | | TestDataIndicator 407032 | | | 0..1 407034 | Indicator 407036 |
| | | | ReconciliationIndicator 407038 | | | 0..1 407040 | Indicator 407042 |
| | | | SenderParty 407044 | | | 0..1 407046 | BusinessDocumentMessageHeaderParty 407048 |
| | | | | InternalID 407050 | | 0..1 407052 | PartyInternalID 407054 |
| | | | | StandardID 407056 | | 0..n 407058 | PartyStandardID 407060 |

FIG. 407-3

| Package | level 1 | level 2 | level 3 | level 4 | level 5 | Cardinality | Datatype Name |
|---|---|---|---|---|---|---|---|
| | | | | ContactPerson 407062 | | 0..1 407064 | BusinessDocumentMessageHeaderPartyContactPerson 407066 |
| | | | RecipientParty 407068 | | | 0..n 407070 | BusinessDocumentMessageHeaderParty 407072 |
| | | | | InternalID 407074 | | 0..1 407076 | PartyInternalID 407078 |
| | | | | StandardID 407080 | | 0..n 407082 | PartyStandardID 407084 |
| | | | | ContactPerson 407086 | | 0..1 407088 | BusinessDocumentMessageHeaderPartyContactPerson 407090 |

FIG. 407-4

| Package | level 1 | level 2 | level 3 | level 4 | level 5 | Cardinality | Datatype Name |
|---|---|---|---|---|---|---|---|
| | | | BusinessS-copeBusi-nessProcess 407092 | | | 0..n 407094 | BusinessS-copeBusi-nessProcess 407096 |
| | | | | TypeCode 407098 | | 1..1 4070100 | BusinessS-copeBusi-nessProc-essTypeCode 4070102 |
| | | | | InstanceID 4070104 | | 0..1 4070106 | BusinessS-copeBusi-nessProc-essInstanceID 4070108 |
| | | | | ID 4070110 | | 0..1 4070112 | BusinessS-copeBusi-nessProcessID 4070114 |
| ProcurementPlan-ningOrder 4070116 | | Procurement-PlanningOrder 4070118 | | | | 1..1 4070120 | |

FIG. 407-5

| Package | level 1 | level 2 | level 3 | level 4 | level 5 | Cardinality | Datatype Name |
|---|---|---|---|---|---|---|---|
| | | | PlanningVersionID 4070122 | | | 1..1 4070124 | PlanningVersionID 4070126 |
| ProcurementPlanningOrderItem 4070128 | | | ProcurementPlanningOrderItem 4070130 | | | 1..1 4070132 | |
| | | | | ProductInternalID 4070134 | | 1..1 4070136 | ProductInternalID 4070138 |
| | | | | LocationInternalID 4070140 | | 1..1 4070142 | LocationInternalID 4070144 |
| ProcurementPlanningOrderItemScheduleLine 4070146 | | | | ProcurementPlanningOrderItemScheduleLine 4070148 | | 1..1 4070150 | |
| | | | | | Quantity 4070152 | 1..1 4070154 | Quantity 4070156 |

FIG. 407-6

| Package | level 1 | level 2 | level 3 | level 4 | level 5 | Cardinality | Datatype Name |
|---|---|---|---|---|---|---|---|
| | | | | | FixedIndica-tor 4070158 | 1..1 4070160 | Indicator 4070162 |
| | | | | | Availability-DateTime 4070164 | 1..1 4070166 | GLOBAL_Date Time 4070168 |

FIG. 415-1

| Package | level 1 | level 2 | level 3 | Cardinality | Datatype Name |
|---|---|---|---|---|---|
| ProductionBillOfMaterialVariantBasicDataByMaterialAndPlantQueryMessage_sync 415000 | ProductionBillOfMaterialVariantBasicDataByMaterialAndPlantQueryMessage_sync 415002 | | | | ProductionBillofMaterialVariantBasicDataByMaterialAndPlantQueryMessage_sync 415004 |
| Selection 415006 | | ProductionBillOfMaterialVariantBasicDataSelectionByMaterialAndPlant 415008 | | 1 415010 | ProductionBillOfMaterialVariantBasicDataSelectionByMaterialAndPlant 415012 |
| | | | MaterialInternalID 415014 | 0..1 415016 | ProductInternalID 415018 |
| | | | PlantID 415020 | 0..1 415022 | PlantID 415024 |
| | | | ProductionBillOfMaterialVariantID 415026 | 0..1 415028 | ProductionBillOfMaterialVariantID 415030 |

FIG. 415-2

| Package | level 1 | level 2 | level 3 | Cardinality | Datatype Name |
|---|---|---|---|---|---|
| | | | ValidityDate 415032 | 0..1 415034 | Date 415036 |
| | | | Production-BillOfMateri-alVarian-tUsageCode 415038 | 0..1 415040 | ProductionBillOfMaterialVarian-tUsageCode 415042 |

FIG. 416-1

| Package | level 1 | level 2 | level 3 | level 4 | Cardinality | Datatype Name |
|---|---|---|---|---|---|---|
| ProductionBillOfMaterialVariant-BasicDataByMaterialAndPlant-ResponseMessage_sync 416000 | ProductionBillOfMaterialVariant-BasicDataByMaterialAndPlantResponseMessage_sync 416002 | | | | | ProductionBillofMaterialVariantBasicDataByMaterialAndPlantResponseMessage_sync 416004 |
| Production-BillOfMaterialVariant-BasicData 416006 | | Production-BillOfMaterial 416008 | | | 0..n 416010 | ProductionBillOfMaterial 416012 |
| | | | InternalID 416014 | | 1 416016 | ProductionBillOfMaterialInternalID 416018 |
| | | | ID 416020 | | 0..1 416022 | ProductionBillOfMaterialID 416024 |
| | | | Description 416026 | | 0..1 416028 | SHORT_Description 416030 |
| | | | Variant 416032 | | 1..n 416034 | Variant 416036 |

FIG. 416-2

| Package | level 1 | level 2 | level 3 | level 4 | Cardinality | Datatype Name |
|---|---|---|---|---|---|---|
| | | | | MaterialInternalID 416038 | 1 416040 | ProductInternalID 416042 |
| | | | | PlantID 416044 | 0..1 416046 | PlantID 416048 |
| | | | | ID 416050 | 0..1 416052 | ProductionBillOfMaterialVariantID 416054 |
| | | | | UsageCode 416056 | 1 416058 | ProductionBillOfMaterialVariantUsageCode 416060 |
| | | | | UsageName 416062 | 0..1 416064 | LEN30_Name 416066 |
| | | | | MaterialDescription 416068 | 1 416070 | SHORT_Description 416072 |
| | | | | Description 416074 | 0..1 416076 | SHORT_Description 416078 |
| | | | | ValidityPeriod 416080 | 0..1 416082 | UPPEROPEN_Date Period |

FIG. 416-3

| Package | level 1 | level 2 | level 3 | level 4 | Cardinality | Datatype Name |
|---|---|---|---|---|---|---|
| | | | | | | 416084 |
| | | | | ActivationProfileCode 416086 | 0..1 416088 | ProductionBillOfMaterialVariantActivationProfileCode 416090 |
| Log 416092 | | Log 416094 | | | 0..1 416096 | Log 416098 |

FIG. 417-1

| Package | level 1 | level 2 | level 3 | Cardinality | Datatype Name |
|---|---|---|---|---|---|
| ProductionBillOfMaterialVariantItem-BasicDataByVariantIdentifyingElementsQueryMessage_sync 417000 | ProductionBillOfMaterialVariantItemBasicDataByVariantIdentifyingElementsQueryMessage_sync 417002 | | | | ProductionBillofMaterialVariantItemBasicDataByVariantIdentifyingElementsQueryMessage_sync 417004 |
| Selection 417006 | | ProductionBillOfMaterialVariantItemBasicDataSelectionByVariantIdentifyingElements 417008 | | 1 417010 | ProductionBillofMaterialVariantItemBasicDataSelectionByVariantIdentifyingElements 417012 |
| | | | MaterialInternalID 417014 | 1 417016 | ProductInternalID 417018 |

FIG. 417-2

| Package | level 1 | level 2 | level 3 | Cardinality | Datatype Name |
|---|---|---|---|---|---|
| | | | PlantID 417020 | 1 417022 | PLantID 417024 |
| | | | ProductionBillOfMaterialVariantID 417026 | 0..1 417028 | ProductionBillOfMaterialVariantID 417030 |
| | | | ValidityDate 417032 | 0..1 417034 | Date 417036 |
| | | | ProductionBillOfMaterialVariantUsageCode 417038 | 1 417040 | ProductionBillOfMaterialVariantUsageCode 417042 |

FIG. 418-1

| Package | level 1 | level 2 | level 3 | level 4 | level 5 | Cardinality | Datatype Name |
|---|---|---|---|---|---|---|---|
| ProductionBillOfMaterialVariantItemBasicDataByVariantIdentifyingElementsResponseMessage_sync 418000 | ProductionBillOfMaterialVariantItemBasicDataByVariantIdentifyingElementsResponseMessage_sync 418002 | | | | | | ProductionBillofMaterialItemBasicDataByVariantIdentifyingElementsResponseMessage_sync 418004 |
| ProductionBillOfMaterial 418006 | | ProductionBillOfMaterial 418008 | | | | 0..1 418010 | ProductionBillOfMaterial 418012 |
| | | | InternalID 418014 | | | 1 418016 | ProductionBillOfMaterialInternalID 418018 |
| | | | ID 418020 | | | 0..1 418022 | ProductionBillOfMaterialID 418024 |

FIG. 418-2

| Package | level 1 | level 2 | level 3 | level 4 | level 5 | Cardinality | Datatype Name |
|---|---|---|---|---|---|---|---|
| | | | Description 418026 | | | 0..1 418028 | SHORT_Description 418030 |
| | | | Variant 418032 | | | 1 418034 | Variant 418036 |
| | | | | MaterialInternalID 418038 | | 1 418040 | ProductInternalID 418042 |
| | | | | PlantID 418044 | | 0..1 418046 | PlantID 418048 |
| | | | | ID 418050 | | 0..1 418052 | ProductionBillOfMaterialVariantID 418054 |

FIG. 418-3

| Package | level 1 | level 2 | level 3 | level 4 | level 5 | Cardinality | Datatype Name |
|---|---|---|---|---|---|---|---|
| | | | | Base Quantity 418056 | | 0..1 418058 | BaseQuantity 418060 |
| | | | | ValidityDate 418062 | | 1 418064 | Date 418066 |
| | | | | UsageCode 418068 | | 1 418070 | ProductionBillOfMaterialVariantUsageCode 418072 |
| | | | | MaterialDescription 418074 | | 1 418076 | SHORT_Description 418078 |
| | | | | UsageName 418080 | | 1 418082 | LEN30_Name 418084 |

FIG. 418-4

| Package | level 1 | level 2 | level 3 | level 4 | level 5 | Cardinality | Datatype Name |
|---|---|---|---|---|---|---|---|
| | | | | Description 418086 | | 0..1 418088 | SHORT_Description 418090 |
| | | | | Item 418092 | | 0..n 418094 | ProductionBillOfMaterialVariantItem 418096 |
| | | | | | ID 418098 | 1 4180100 | ProductionBillOfMaterialItemID 4180102 |
| | | | | | MaterialInternalID 4180104 | 1 4180106 | ProductInternalID 4180108 |
| | | | | | OriginItemID 4180110 | 1 4180112 | ProductionBillOfMaterialItemID 4180114 |

FIG. 418-5

| Package | level 1 | level 2 | level 3 | level 4 | level 5 | Cardinality | Datatype Name |
|---|---|---|---|---|---|---|---|
| | | | | | SubItemExistsIndicator 4180116 | 0..1 4180118 | SubItemExistsIndicator 4180120 |
| | | | | | StartEngineeringChangeOrderID 4180122 | 0..1 4180124 | EngineeringChangeOrderID 4180126 |
| | | | | | EndEngineeringChangeOrderID 4180128 | 0..1 4180130 | EngineeringChangeOrderID 4180132 |
| | | | | | ValidityDatePeriod 4180134 | 1 4180136 | UPPEROPEN_DatePeriod 4180138 |
| | | | | | LogisticsItemTypeCode 4180140 | 1 4180142 | LogisticsItemTypeCode 4180144 |

FIG. 418-6

| Package | level 1 | level 2 | level 3 | level 4 | level 5 | Cardinality | Datatype Name |
|---|---|---|---|---|---|---|---|
| | | | | | LogisticsItemIndexText 4180146 | 1 4180148 | LogisticsItemIndexText 4180150 |
| | | | | | DesiredQuantity 4180152 | 1 4180154 | Quantity 4180156 |
| | | | | | QuantityFixedIndicator 4180158 | 1 4180160 | FixedIndicator 4180162 |
| | | | | | MaterialDescription 4180164 | 1 4180166 | SHORT_Description 4180168 |
| | | | | | Description 4180170 | 0..1 4180172 | SHORT_Description 4180174 |

FIG. 418-7

| Package | level 1 | level 2 | level 3 | level 4 | level 5 | Cardinality | Datatype Name |
|---|---|---|---|---|---|---|---|
| | | | | | AdditionalDescription 4180176 | 0..1 4180178 | SHORT_Description 4180180 |
| | | | | | OperationScrapPercent 4180182 | 0..1 4180184 | SMALLNONNEGATIVE_Percent 4180186 |
| | | | | | ComponentScrapPercent 4180188 | 0..1 4180190 | SMALLNONNEGATIVE_Percent 4180192 |
| | | | | | MaterialRoleCode 4180194 | 0..1 4180196 | MaterialRoleCode 4180198 |

FIG. 418-8

| Package | level 1 | level 2 | level 3 | level 4 | level 5 | Cardinality | Datatype Name |
|---|---|---|---|---|---|---|---|
| | | | | | PhantomAssemblyIndicator 4180200 | 0..1 4180202 | Indicator 4180204 |
| | | | | | ItemToProductionRelevanceIndicator 4180206 | 0..1 4180208 | RelevanceIndicator 4180210 |
| | | | | | MaterialProvidedIndicator 4180212 | 0..1 4180214 | ProvidedIndicator 4180216 |
| | | | | | BackflushIndicator 4180218 | 0..1 4180220 | BackflushIndicator 4180222 |

FIG. 418-9

| Package | level 1 | level 2 | level 3 | level 4 | level 5 | Cardinality | Datatype Name |
|---|---|---|---|---|---|---|---|
| | | | | | BulkMaterialIndicator 4180224 | 0..1 4180226 | BulkMaterialIndicator 4180228 |
| | | | | | BulkMaterialMasterRecordIndicator 4180230 | 0..1 4180232 | BulkMaterialIndicator 4180234 |
| | | | | | IssueLocationID 4180236 | 0..1 4180238 | LocationID 4180240 |
| | | | | | SupplyAreaLocationName 4180242 | 0..1 4180244 | MEDIUM_Name 4180246 |

FIG. 418-10

| Package | level 1 | level 2 | level 3 | level 4 | level 5 | Cardinality | Datatype Name |
|---|---|---|---|---|---|---|---|
| | | | | | LogisticsItemTypeName 4180248 | 1 4180250 | LEN30_Name 4180252 |
| Log 4180254 | | Log 4180256 | | | | 0..1 4180258 | Log 4180260 |

FIG. 424

| Package | level1 | level2 | level3 | Cardinality | DatatypeName |
|---|---|---|---|---|---|
| ProductionConfirmation-CancelConfirmationMessage_sync 42400 | ProductionConfirmationCancelConfirmationMessage_sync 42402 | | | | ProductionConfirmationCancelConfirmationMessage_sync 42404 |
| MessageHeader 42406 | | MessageHeader 42408 | | 0...1 42410 | BasicBusiness-DocumentMessage-Header 42412 |
| ProductionConfirmation 42414 | | ProductionConfirmation 42416 | | 0..1 42418 | |
| | | | GroupID 42420 | 1 42422 | ProductionConfirmationGroupID 42424 |
| | | | CounterValue 42426 | 1 42428 | CounterValue 42430 |
| Log 42432 | | Log 42434 | | 1 42436 | Log 42438 |

FIG. 425

| Package | level 1 | level 2 | level 3 | Cardinality | Datatype Name |
|---|---|---|---|---|---|
| ProductionConfirmation-CancelRequestMessage_sync 42500 | ProductionConfirmationCancelRequest-Message_sync 42502 | | | | ProductionConfirmation-CancelRequestMessage_sync 42504 |
| MessageHeader 42506 | | Message-Header 42508 | | 1 42510 | BasicBusinessDocument-MessageHeader 42512 |
| ProductionConfirmation 42514 | | Production-Confirmation 42516 | | 0..1 42518 | |
| | | | GroupID 42520 | 1 42522 | ProductionConfirmation-GroupID 42524 |
| | | | Counter-Value 42526 | 1 42528 | CounterValue 42530 |

FIG. 426-1

| Package | level 1 | level 2 | level 3 | Cardinality | Datatype Name |
|---|---|---|---|---|---|
| ProductionConfirmationCreateConfirmationMessage 42600 | ProductionConfirmationCreateConfirmationMessag 42602 | | | | ProductionConfirmationCreateConfirmationMessage 42604 |
| MessageHeader 42606 | | MessageHeader 42608 | | 0…1 42610 | BasicBusinessDocumentMessageHeader 42612 |
| ProductionConfirmation 42614 | | ProductionConfirmation 42616 | | 0..1 42618 | |
| | | | GroupID 42620 | 1 42622 | ProductionConfirmationGroupID 42624 |
| | | | CounterValue 42626 | 1 42628 | CounterValue 42630 |
| | | | RecordTypeCode 42632 | 1 42634 | ProductionConfirmationRecordTypeCode 42636 |

FIG. 426-2

| Package | level 1 | level 2 | level 3 | Cardinality | Datatype Name |
|---|---|---|---|---|---|
| | | | CreationDateTime 42638 | 1 42640 | DateTime 42642 |
| | | | CreationUserAccountID 42644 | 1 42646 | UserAccountID 42648 |
| Log 42650 | | Log 42652 | | 1 42654 | Log 42656 |

FIG. 427-1

| Package | level 1 | level 2 | level 3 | Cardinality | Datatype Name |
|---|---|---|---|---|---|
| ProductionConfirmationCreateConfirmationMessage_sync 42700 | ProductionConfirmationCreateConfirmationMessage_sync 42702 | | | | ProductionConfirmationCreateConfirmationMessage_sync 42704 |
| MessageHeader 42706 | | MessageHeader 42708 | | 0...1 42710 | BasicBusinessDocumentMessageHeader 42712 |
| ProductionConfirmation 42714 | | ProductionConfirmation 42716 | | 0..1 42718 | |
| | | | GroupID 42720 | 1 42722 | ProductionConfirmationGroupID 42724 |
| | | | CounterValue 42726 | 1 42728 | CounterValue 42730 |
| | | | RecordTypeCode 42732 | 1 42734 | ProductionConfirmationRecordTypeCode 42736 |

FIG. 427-2

| Package | | level 1 | level 2 | level 3 | Cardinality | Datatype Name |
|---|---|---|---|---|---|---|
| | | | | Creation-DateTime 42738 | 1 42740 | DateTime 42742 |
| | | | | Crea-tionUserAc-countID 42744 | 1 42746 | UserAccountID 42748 |
| | Log 42750 | | Log 42752 | | 1 42754 | Log 42756 |

FIG. 428-1

| Package | | level 1 | level 2 | level 3 | level 4 | Cardinality | Datatype Name |
|---|---|---|---|---|---|---|---|
| ProductionConfirmationCreateRequestMessage 42800 | | ProductionConfirmationCreateRequestMessage 42802 | | | | | ProductionConfirmationCreateRequestMessage 42804 |
| | MessageHeader 42806 | | MessageHeader 42808 | | | 1 42810 | BasicBusinessDocumentMessageHeader 42812 |
| | ProductionConfirmation 42814 | | ProductionConfirmation 42816 | | | 1 42818 | |
| | | | | GroupID 42820 | | 0..1 42822 | ProductionConfirmationGroupID 42824 |

FIG. 428-2

| Package | | level 1 | level 2 | level 3 | level 4 | Cardinality | Datatype Name |
|---|---|---|---|---|---|---|---|
| | | | | ExternalSystemConfirmationID 42826 | | 0..1 42828 | ProductionConfirmationExternalSystemConfirmationID 42830 |
| | | | | ProductionOrderID 42832 | | 0..1 42834 | ProductionOrderID 42836 |
| | | | | ProductionOrderSequenceID 42838 | | 0..1 42840 | ProductionOrderSequenceID 42842 |
| | | | | ProductionOrderOperationID 42844 | | 0..1 42846 | OperationID 42848 |
| | | | | PlantID 42850 | | 0..1 42852 | PlantID 42854 |
| | | | | WorkCentreID 42856 | | 0..1 42858 | WorkCentreID 42860 |

FIG. 428-3

| Package | | level 1 | level 2 | level 3 | level 4 | Cardinality | Datatype Name |
|---|---|---|---|---|---|---|---|
| | | | | CapacitySplitID 42862 | | 0..1 42864 | CapacitySplitID 42866 |
| | | | | ExternalSystemUserAccountID 42868 | | 0..1 42870 | UserAccountID 42872 |
| | | | | EmployeeID 42874 | | 0..1 42876 | EmployeeID 42878 |
| | | | | EmployeeTimeRecordingCardID 42880 | | 0..1 42882 | EmployeeTimeRecordingCardID 42884 |
| | | | | CompensationComponentTypeID 42886 | | 0..1 42888 | Compensation-Component-TypeID 42890 |

FIG. 428-4

| Package | level 1 | level 2 | level 3 | level 4 | Cardinality | Datatype Name |
|---|---|---|---|---|---|---|
| | | | CompensationComponentTypeGroupID 42892 | | 0..1 42894 | Compensation-Component-TypeGroupID 42896 |
| | | | RecordTypeCode 42898 | | 1 428100 | ProductionConfirmationRecord-TypeCode 428102 |
| | | | PostingDate 428104 | | 0..1 428106 | Date 428108 |
| | | | OpenReservationCompletedIndicator 428110 | | 0..1 428112 | Indicator 428114 |
| | | | CapacityCategoryCode 428116 | | 0..1 428118 | CapacityCategoryCode 428120 |

FIG. 428-5

| Package | level 1 | level 2 | level 3 | level 4 | Cardinality | Datatype Name |
|---|---|---|---|---|---|---|
| | | | Employee-SuitabilityCode 428122 | | 0..1 428124 | EmployeeSuitabil-ityCode 428126 |
| | | | Employ-eeNumber-Value 428128 | | 0..1 428130 | NumberValue 428132 |
| | | | ExternalSys-temCreation-DateTime 428134 | | 0..1 428136 | DateTime 428138 |
| | | | Execution-DateTimePe-riod 428140 | | 0..1 428142 | UPPEROPEN_LOCAL_DateTime Period 428144 |
| | | | Setup-DateTimePe-riod 428146 | | 0..1 428148 | UPPEROPEN_LOCAL_DateTime Period 428150 |

FIG. 428-6

| Package | level 1 | level 2 | level 3 | level 4 | Cardinality | Datatype Name |
|---|---|---|---|---|---|---|
| | | | Processing-DateTimePe-riod 428152 | | 0..1 428154 | UPPEROPEN_LOCAL_DateTime Period 428156 |
| | | | Teardown-DateTimePe-riod 428158 | | 0..1 428160 | UPPEROPEN_LOCAL_DateTime Period 428162 |
| | | | FirstWorkQuantity 428164 | | 0..1 428166 | Quantity 428168 |
| | | | FirstWorkQuantityComplet-edIndicator 428170 | | 0..1 428172 | Indicator 428174 |
| | | | Second-WorkQuantity 428176 | | 0..1 428178 | Quantity 428180 |

FIG. 428-7

| Package | | | level 1 | level 2 | level 3 | level 4 | Cardinality | Datatype Name |
|---|---|---|---|---|---|---|---|---|
| | | | | | Second-WorkQuantity-CompletedIndicator 428182 | | 0..1 428184 | Indicator 428186 |
| | | | | | Third-WorkQuantity 428188 | | 0..1 428190 | Quantity 428192 |
| | | | | | Third-WorkQuantity-CompletedIndicator 428194 | | 0..1 428196 | Indicator 428198 |
| | | | | | Fourth-WorkQuantity 428200 | | 0..1 428202 | Quantity 428204 |

FIG. 428-8

| Package | | | level 1 | level 2 | level 3 | level 4 | Cardinality | Datatype Name |
|---|---|---|---|---|---|---|---|---|
| | | | | | Fourth-WorkQuantity-CompletedIndicator 428206 | | 0..1 428208 | Indicator 428210 |
| | | | | | Fifth-WorkQuantity 428212 | | 0..1 428214 | Quantity 428216 |
| | | | | | Fifth-WorkQuantity-CompletedIndicator 428218 | | 0..1 428220 | Indicator 428222 |
| | | | | | Sixth-WorkQuantity 428224 | | 0..1 428226 | Quantity 428228 |

FIG. 428-9

| Package | | | level 1 | level 2 | level 3 | level 4 | Cardinality | Datatype Name |
|---|---|---|---|---|---|---|---|---|
| | | | | | SixthWorkQuantityCompletedIndicator 428230 | | 0..1 428232 | Indicator 428234 |
| | | | | | BusinessProcessWorkQuantity 428236 | | 0..1 428238 | Quantity 428240 |
| | | | | | BusinessProcessWorkQuantityCompletedIndicator 428242 | | 0..1 428244 | Indicator 428246 |
| | | | | | ConfirmQuantity 428248 | | 0..1 428250 | Quantity 428252 |
| | | | | | ScrapQuantity 428254 | | 0..1 428256 | Quantity 428258 |

FIG. 428-10

| Package | | | level 1 | level 2 | level 3 | level 4 | Cardinality | Datatype Name |
|---|---|---|---|---|---|---|---|---|
| | | | | | ReworkQuantity 428260 | | 0..1 428262 | Quantity 428264 |
| | | | | | LogisticsDeviationReasonCode 428266 | | 0..1 428268 | LogisticsDeviationReasonCode 428270 |
| | | | | | Description 428272 | | 0..1 428274 | ProductionConfirmationDescription 428276 |
| | | GoodsMovementInformation 428278 | | | GoodsMovementInformation 428280 | | 0..n 428282 | |
| | | | | | | MaterialInternalID 428284 | 1 428286 | ProductInternalID 428288 |

FIG. 428-11

| Package | | | level 1 | level 2 | level 3 | level 4 | Cardinality | Datatype Name |
|---|---|---|---|---|---|---|---|---|
| | | | | | | PlantID 428290 | 1 428292 | PlantID 428294 |
| | | | | | | Inventory-ManagedLo-cationInter-nalID 428296 | 0..1 428298 | LocationInternalID 428300 |
| | | | | | | BatchID 428302 | 0..1 428304 | BatchID 428306 |
| | | | | | | Consign-mentStock-VendorID 428308 | 0..1 428310 | PartyInternalID 428312 |
| | | | | | | Consign-mentStock-CustomerID 428314 | 0..1 428316 | BusinessPart-nerID 428318 |

FIG. 428-12

| Package | | | level 1 | level 2 | level 3 | level 4 | Cardinality | Datatype Name |
|---|---|---|---|---|---|---|---|---|
| | | | | | | SalesOrde-rID 428320 | 0..1 428322 | SalesOrderID 428324 |
| | | | | | | SalesOrde-rItemID 428326 | 0..1 428328 | SalesOrderItemID 428330 |
| | | | | | | Produc-tionOrderID 428332 | 1 428334 | ProductionOrde-rID 428336 |
| | | | | | | Produc-tionOrde-rItemID 428338 | 0..1 428340 | ProductionOrde-rItemID 428342 |
| | | | | | | Produc-tionOrder-OperationID 428344 | 0..1 428346 | OperationID 428348 |

FIG. 428-13

| Package | | | level 1 | level 2 | level 3 | level 4 | Cardinality | Datatype Name |
|---|---|---|---|---|---|---|---|---|
| | | | | | | Reserva-tionID 428350 | 0..1 428352 | ReservationID 428354 |
| | | | | | | Reservatio-nItemID 428356 | 0..1 428358 | Reservatio-nItemID 428360 |
| | | | | | | Project-WorkBreak-downStructu-reElementID 428362 | 0..1 428364 | ProjectWork-BreakdownStruc-tureElementID 428366 |
| | | | | | | GoodsMove mentType-Code 428368 | 1 428370 | GoodsMove-mentTypeCode 428372 |
| | | | | | | InventoryUs-abilityCode 428374 | 0..1 428376 | InventoryUsabili-tyCode 428378 |

FIG. 428-14

| Package | | | level 1 | level 2 | level 3 | level 4 | Cardinality | Datatype Name |
|---|---|---|---|---|---|---|---|---|
| | | | | | | Inven-torySpecial-StockType-Code 428380 | 0..1 428382 | InventorySpecial-StockTypeCode 428384 |
| | | | | | | Inventory-Valuation-TypeCode 428386 | 0..1 428388 | InventoryValua-tionTypeCode 428390 |
| | | | | | | InputQuan-tity 428392 | 1 428394 | Quantity 428396 |
| | | | | | | Delivery-Complet-edIndicator 428398 | 0..1 428400 | Indicator 428402 |
| | | | | | | Withdrawn-Complet-edIndicator 428404 | 0..1 428406 | Indicator 428408 |

FIG. 428-15

| Package | | | level 1 | level 2 | level 3 | level 4 | Cardinality | Datatype Name |
|---|---|---|---|---|---|---|---|---|
| | | | | | | GoodsMovementItem-Description 428410 | 0..1 428412 | GoodsMovementItemDescription 428414 |
| | | | | | | GoodsRecipientName 428416 | 0..1 428418 | GoodsRecipient-Name 428420 |
| | | | | | | Unloading-PointName 428422 | 0..1 428424 | UnloadingPoint-Name 428426 |
| | | | | | | GoodsMovementReferenceDocumentType-Code 428428 | 1 428430 | GoodsMovementReferenceDocumentTypeCode 428432 |
| | | | | | | GoodsMovementReasonCode 428434 | 0..1 428436 | GoodsMovementReasonCode 428438 |

FIG. 428-16

| Package | | | level 1 | level 2 | level 3 | level 4 | Cardinality | Datatype Name |
|---|---|---|---|---|---|---|---|---|
| | | | | | | BatchExpira-tionDate 428440 | 0..1 428442 | Date 428444 |
| | | | | | | BatchPro-ductionDate 428446 | 0..1 428448 | Date 428450 |

FIG. 429-1

| Package | level 1 | level 2 | level 3 | level 4 | Cardinality | Datatype Name |
|---|---|---|---|---|---|---|
| ProductionConfirmation-CreateRequestMes-sage_sync 42900 | Production-Confirma-tionCre-ateRequest-Mes-sage_sync 42902 | | | | | ProductionConfirma-tionCreateRequest-Message_sync 42904 |
| MessageHeader 42906 | | Message-Header 42908 | | | 1 42910 | BasicBusinessDocu-mentMessageHeader 42912 |
| ProductionConfirma-tion 42914 | | Production-Confirmation 42916 | | | 1 42918 | |
| | | | GroupID 42920 | | 0..1 42922 | ProductionConfirma-tionGroupID 42924 |
| | | | ExternalSys-temConfirma-tionID 42926 | | 0..1 42928 | ProductionConfirma-tionExternalSystem-ConfirmationID 42930 |

FIG. 429-2

| Package | level 1 | level 2 | level 3 | level 4 | Cardinality | Datatype Name |
|---|---|---|---|---|---|---|
| | | | ProductionOrderID 42932 | | 0..1 42934 | ProductionOrderID 42936 |
| | | | ProductionOrderSequenceID 42938 | | 0..1 42940 | ProductionOrderSequenceID 42942 |
| | | | ProductionOrderOperationID 42944 | | 0..1 42946 | OperationID 42948 |
| | | | PlantID 42950 | | 0..1 42952 | PlantID 42954 |
| | | | WorkCentreID 42956 | | 0..1 42958 | WorkCentreID 42960 |
| | | | CapacitySplitID 42962 | | 0..1 42964 | CapacitySplitID 42966 |
| | | | ExternalSystemUserAccountID 42968 | | 0..1 42970 | UserAccountID 42972 |

FIG. 429-3

| Package | level 1 | level 2 | level 3 | level 4 | Cardinality | Datatype Name |
|---|---|---|---|---|---|---|
| | | | EmployeeID 42974 | | 0..1 42976 | EmployeeID 42978 |
| | | | Employ-eeTimeRe-cordingCardID 42980 | | 0..1 42982 | EmployeeTimeRe-cordingCardID 42984 |
| | | | Compensation-Component-TypeID 42986 | | 0..1 42988 | CompensationCom-ponentTypeID 42990 |
| | | | Compensation-Component-TypeGroupID 42992 | | 0..1 42994 | CompensationCom-ponentTypeGroupID 42996 |
| | | | RecordType-Code 42998 | | 1 429100 | ProductionConfirma-tionRecordTypeCode 429102 |
| | | | PostingDate 429104 | | 0..1 429106 | Date 429108 |

FIG. 429-4

| Package | level 1 | level 2 | level 3 | level 4 | Cardinality | Datatype Name |
|---|---|---|---|---|---|---|
| | | | OpenReservationCompletedIndicator 429110 | | 0..1 429112 | Indicator 429114 |
| | | | CapacityCategoryCode 429116 | | 0..1 429118 | CapacityCategory-Code 429120 |
| | | | EmployeeSuitabilityCode 429122 | | 0..1 429124 | EmployeeSuitability-Code 429126 |
| | | | EmployeeNumberValue 429128 | | 0..1 429130 | NumberValue 429132 |
| | | | ExternalSystemCreationDateTime 429134 | | 0..1 429136 | DateTime 429138 |
| | | | Execution-DateTimePeriod 429140 | | 0..1 429142 | UPPEROPEN_LOCAL_DateTimePeriod 429144 |

FIG. 429-5

| Package | level 1 | level 2 | level 3 | level 4 | Cardinality | Datatype Name |
|---|---|---|---|---|---|---|
| | | | Setup-DateTimePeriod 429146 | | 0..1 429148 | UPPEROPEN_LOCAL_DateTimePeriod 429150 |
| | | | Processing-DateTimePeriod 429152 | | 0..1 429154 | UPPEROPEN_LOCAL_DateTimePeriod 429156 |
| | | | Teardown-DateTimePeriod 429158 | | 0..1 429160 | UPPEROPEN_LOCAL_DateTimePeriod 429162 |
| | | | FirstWorkQuantity 429164 | | 0..1 429166 | Quantity 429168 |
| | | | FirstWorkQuantityCompletedIndicator 429170 | | 0..1 429172 | Indicator 429174 |
| | | | Second-WorkQuantity 429176 | | 0..1 429178 | Quantity 429180 |

FIG. 429-6

| Package | level 1 | level 2 | level 3 | level 4 | Cardinality | Datatype Name |
|---|---|---|---|---|---|---|
| | | | Second-WorkQuantity-CompletedIndi-cator 429182 | | 0..1 429184 | Indicator 429186 |
| | | | ThirdWorkQuan-tity 429188 | | 0..1 429190 | Quantity 429192 |
| | | | ThirdWorkQuan-tityComplet-edIndicator 429194 | | 0..1 429196 | Indicator 429198 |
| | | | Fourth-WorkQuantity 429200 | | 0..1 429202 | Quantity 429204 |
| | | | Fourth-WorkQuantity-CompletedIndi-cator 429206 | | 0..1 429208 | Indicator 429210 |

FIG. 429-7

| Package | level 1 | level 2 | level 3 | level 4 | Cardinality | Datatype Name |
|---|---|---|---|---|---|---|
| | | | FifthWorkQuantity 429212 | | 0..1 429214 | Quantity 429216 |
| | | | FifthWorkQuantityCompletedIndicator 429218 | | 0..1 429220 | Indicator 429222 |
| | | | SixthWorkQuantity 429224 | | 0..1 429226 | Quantity 429228 |
| | | | SixthWorkQuantityCompletedIndicator 429230 | | 0..1 429232 | Indicator 429234 |
| | | | BusinessProcessWorkQuantity 429236 | | 0..1 429238 | Quantity 429240 |

FIG. 429-8

| Package | level 1 | level 2 | level 3 | level 4 | Cardinality | Datatype Name |
|---|---|---|---|---|---|---|
| | | | BusinessProcessWorkQuantityCompletedIndicator 429242 | | 0..1 429244 | Indicator 429246 |
| | | | ConfirmQuantity 429248 | | 0..1 429250 | Quantity 429252 |
| | | | ScrapQuantity 429254 | | 0..1 429256 | Quantity 429258 |
| | | | ReworkQuantity 429260 | | 0..1 429262 | Quantity 429264 |
| | | | LogisticsDeviationReasonCode 429266 | | 0..1 429268 | LogisticsDeviationReasonCode 429270 |
| | | | Description 429272 | | 0..1 429274 | ProductionConfirmationDescription 429276 |

FIG. 429-9

| Package | level 1 | level 2 | level 3 | level 4 | Cardinality | Datatype Name |
|---|---|---|---|---|---|---|
| GoodsMove-mentInformation 429278 | | | GoodsMove-mentInformation 429280 | | 0..n 429282 | |
| | | | | MaterialInter-nalID 429284 | 1 429286 | ProductInternalID 429288 |
| | | | | PlantID 429290 | 1 429292 | PlantID 429294 |
| | | | | InventoryMan-agedLocation-InternalID 429296 | 0..1 429298 | LocationInternalID 429300 |
| | | | | BatchID 429302 | 0..1 429304 | BatchID 429306 |
| | | | | Consignment-StockVendorID 429308 | 0..1 429310 | PartyInternalID 429312 |

FIG. 429-10

| Package | level 1 | level 2 | level 3 | level 4 | Cardinality | Datatype Name |
|---|---|---|---|---|---|---|
| | | | | ConsignmentStockCustomerID 429314 | 0..1 429316 | BusinessPartnerID 429318 |
| | | | | SalesOrderID 429320 | 0..1 429322 | SalesOrderID 429324 |
| | | | | SalesOrderItemID 429326 | 0..1 429328 | SalesOrderItemID 429330 |
| | | | | ProductionOrderID 429332 | 1 429334 | ProductionOrderID 429336 |
| | | | | ProductionOrderItemID 429338 | 0..1 429340 | ProductionOrderItemID 429342 |
| | | | | ProductionOrderOperationID 429344 | 0..1 429346 | OperationID 429348 |

FIG. 429-11

| Package | level 1 | level 2 | level 3 | level 4 | Cardinality | Datatype Name |
|---|---|---|---|---|---|---|
| | | | | ReservationID 429350 | 0..1 429352 | ReservationID 429354 |
| | | | | Reservatio-nItemID 429356 | 0..1 429358 | ReservationItemID 429360 |
| | | | | ProjectWork-Breakdown-StructureEle-mentID 429362 | 0..1 429364 | ProjectWorkBreak-downStructureEle-mentID 429366 |
| | | | | GoodsMove-mentTypeCode 429368 | 1 429370 | GoodsMovement-TypeCode 429372 |
| | | | | InventoryUs-abilityCode 429374 | 0..1 429376 | InventoryUsability-Code 429378 |
| | | | | InventorySpe-cialStockType-Code 429380 | 0..1 429382 | InventorySpecial-StockTypeCode 429384 |

FIG. 429-12

| Package | level 1 | level 2 | level 3 | level 4 | Cardinality | Datatype Name |
|---|---|---|---|---|---|---|
| | | | | InventoryValuationTypeCode 429386 | 0..1 429388 | InventoryValuationTypeCode 429390 |
| | | | | InputQuantity 429392 | 1 429394 | Quantity 429396 |
| | | | | DeliveryCompletedIndicator 429398 | 0..1 429400 | Indicator 429402 |
| | | | | WithdrawnCompletedIndicator 429404 | 0..1 429406 | Indicator 429408 |
| | | | | GoodsMovementItemDescription 429410 | 0..1 429412 | GoodsMovementItemDescription 429414 |
| | | | | GoodsRecipientName 429416 | 0..1 429418 | GoodsRecipientName 429420 |

FIG. 429-13

| Package | level 1 | level 2 | level 3 | level 4 | Cardinality | Datatype Name |
|---|---|---|---|---|---|---|
| | | | | UnloadingPointName 429422 | 0..1 429424 | UnloadingPointName 429426 |
| | | | | GoodsMovementReferenceDocumentTypeCode 429428 | 1 429430 | GoodsMovementReferenceDocumentTypeCode 429432 |
| | | | | GoodsMovementReasonCode 429434 | 0..1 429436 | GoodsMovementReasonCode 429438 |
| | | | | BatchExpirationDate 429440 | 0..1 429442 | Date 429444 |
| | | | | BatchProductionDate 429446 | 0..1 429448 | Date 429450 |

FIG. 437

| Package | level 1 | level 2 | level 3 | Cardinality | Datatype Name |
|---|---|---|---|---|---|
| ProductionOrder-ByIDQueryMes-sage 437000 | Produc-tionOrderBy-IDQuery-Message 437002 | | | | ProductionOrder-ByIDQueryMes-sage 437004 |
| Message-Header 437006 | | Message-Header 437008 | | 0..1 437010 | BasicBusiness-DocumentMes-sageHeader 437012 |
| ProductionOr-derSelection-ByID 437014 | | Produc-tionOrderSe-lectionByID 437016 | | 1 437018 | |
| | | | ID 437020 | 1 437022 | ProductionOrderID 437024 |

FIG. 438-1

| Package | level 1 | level 2 | level 3 | level 4 | level 5 | level 6 | level 7 | Cardinality | Datatype Name |
|---|---|---|---|---|---|---|---|---|---|
| ProductionOrderByIDResponseMessage 438000 | ProductionOrderByIDResponseMessage 438002 | | | | | | | | ProductionOrderByIDResponseMessage 438004 |
| MessageHeader 438006 | | MessageHeader 438008 | | | | | | 0..1 438010 | BasicBusinessDocumentMessageHeader 438012 |
| ProductionOrder 438014 | | ProductionOrder 438016 | | | | | | 1 438018 | |
| | | | ID 438020 | | | | | 1 438022 | ProductionOrderID 438024 |

FIG. 438-2

| Package | level 1 | level 2 | level 3 | level 4 | level 5 | level 6 | level 7 | Cardinality | Datatype Name |
|---|---|---|---|---|---|---|---|---|---|
| | | | PlantID 438026 | | | | | 1 438028 | PlantID 438030 |
| | | | Supply-Plannin-gAreaID 438032 | | | | | 1 438034 | Supply-Plannin-gAreaID 438036 |
| | | | Material-Require-ment-Planning-Control-lerID 438038 | | | | | 0..1 438040 | Party-InternalID 438042 |
| | | | Produc-tion-Schedul-erID 438044 | | | | | 0..1 438046 | Party-InternalID 438048 |
| | | | MaterialIn-ternalID 438050 | | | | | 0..1 438052 | Product-InternalID 438054 |

FIG. 438-3

| Package | level 1 | level 2 | level 3 | level 4 | level 5 | level 6 | level 7 | Cardinality | Datatype Name |
|---|---|---|---|---|---|---|---|---|---|
| | | | ReservationID 438056 | | | | | 0..1 438058 | ReservationID 438060 |
| | | | ProductionConfirmationGroupID 438062 | | | | | 0..1 438064 | ProductionConfirmationGroup ID 438066 |
| | | | LeadingProductionOrderID 438068 | | | | | 0..1 438070 | ProductionOrderID 438072 |
| | | | SalesOrderID 438074 | | | | | 0..1 438076 | SalesOrderID 438078 |
| | | | SalesOrderItemID 438080 | | | | | 0..1 438082 | SalesOrderItemID 438084 |

FIG. 438-4

| Package | level 1 | level 2 | level 3 | level 4 | level 5 | level 6 | level 7 | Cardinality | Datatype Name |
|---|---|---|---|---|---|---|---|---|---|
| | | | CreationUserAccountID 438086 | | | | | 1 438088 | UserAccount ID 438090 |
| | | | ProjectWorkBreakdownStructureElementID 438092 | | | | | 0..1 438094 | ProjectWorkBreakdownStructureElementID 438096 |
| | | | ImportanceCode 438098 | | | | | 0..1 4380100 | ImportanceCode 4380102 |
| | | | TypeCode 4380104 | | | | | 1 4380106 | ProductionOrderTypeCode 4380108 |

FIG. 438-5

| Package | level 1 | level 2 | level 3 | level 4 | level 5 | level 6 | level 7 | Cardinality | Datatype Name |
|---|---|---|---|---|---|---|---|---|---|
| | | | TypeName 4380110 | | | | | 1 4380112 | ProductionOrderTypeName 4380114 |
| | | | MaterialDescription 4380116 | | | | | 0..1 4380118 | ProductDescription 4380120 |
| | | | DeletedIndicator 4380122 | | | | | 0..1 4380124 | Indicator 4380126 |
| | | | AggregationIndicator 4380128 | | | | | 0..1 4380130 | Indicator 4380132 |

FIG. 438-6

| Package | level 1 | level 2 | level 3 | level 4 | level 5 | level 6 | level 7 | Cardinality | Datatype Name |
|---|---|---|---|---|---|---|---|---|---|
| | | | Produc-tionCon-firmation-Number-Value 4380134 | | | | | 0..1 4380136 | Number-Value 4380138 |
| | | | Creation-Date 4380140 | | | | | 1 4380142 | Date 4380144 |
| | | | Explora-tionDate 4380146 | | | | | 0..1 4380148 | Date 4380150 |
| | | | Sched-uledRe-leaseDate 4380152 | | | | | 1 4380154 | Date 4380156 |
| | | | ActualRe-leased-Date 4380158 | | | | | 1 4380160 | Date 4380162 |

FIG. 438-7

| Package | level 1 | level 2 | level 3 | level 4 | level 5 | level 6 | level 7 | Cardinality | Datatype Name |
|---|---|---|---|---|---|---|---|---|---|
| | | | Planned-Start-DateTime 4380164 | | | | | 1 4380166 | DateTime 4380168 |
| | | | Planne-dEnd-DateTime 4380170 | | | | | 1 4380172 | DateTime 4380174 |
| | | | Confirmed Start-DateTime 4380176 | | | | | 1 4380178 | DateTime 4380180 |
| | | | Con-firmedEnd DateTime 4380182 | | | | | 1 4380184 | DateTime 4380186 |
| | | | Sched-uledStart-DateTime 4380188 | | | | | 1 4380190 | DateTime 4380192 |

FIG. 438-8

| Package | level 1 | level 2 | level 3 | level 4 | level 5 | level 6 | level 7 | Cardinality | Datatype Name |
|---|---|---|---|---|---|---|---|---|---|
| | | | Sched-uledEnd-DateTime 4380194 | | | | | 1 4380196 | DateTime 4380198 |
| | | | Planned-Quantity 4380200 | | | | | 1 4380202 | Quantity 4380204 |
| | | | Expect-edScrapQuantity 4380206 | | | | | 0..1 4380208 | Quantity 4380210 |
| | | | Avail-ableQuan-tity 4380212 | | | | | 0..1 4380214 | Quantity 4380216 |
| Item 4380218 | | | Item 4380220 | | | | | 1..n 4380222 | |
| | | | | ID 4380224 | | | | 1 4380226 | Produc-tionOrde-rItemID 4380228 |

FIG. 438-9

| Package | level 1 | level 2 | level 3 | level 4 | level 5 | level 6 | level 7 | Cardinality | Datatype Name |
|---|---|---|---|---|---|---|---|---|---|
| | | | | PlantID 4380230 | | | | 1 4380232 | PlantID 4380234 |
| | | | | Supply-Plannin-gAreaID 4380236 | | | | 1 4380238 | Supply-Plannin-gAreaID 4380240 |
| | | | | Material-Require-mentSup-plyPlan-ningA-reaID 4380242 | | | | 0..1 4380244 | Supply-Plannin-gAreaID 4380246 |
| | | | | Produc-tionVer-sionID 4380248 | | | | 0..1 4380250 | Produc-tionVer-sionID 4380252 |
| | | | | Materi-alInter-nalID 4380254 | | | | 0..1 4380256 | Product-InternalID 4380258 |

FIG. 438-10

| Package | level 1 | level 2 | level 3 | level 4 | level 5 | level 6 | level 7 | Cardinality | Datatype Name |
|---|---|---|---|---|---|---|---|---|---|
| | | | | InventoryManagedLocationInternalID 4380260 | | | | 0..1 4380262 | Location-InternalID 4380264 |
| | | | | BatchID 4380266 | | | | 0..1 4380268 | BatchID 4380270 |
| | | | | MaterialDescription 4380272 | | | | 0..1 4380274 | Product-Description 4380276 |
| | | | | DeliveryCompletedIndicator 4380278 | | | | 0..1 4380280 | Indicator 4380282 |
| | | | | DeletedIndicator 4380284 | | | | 0..1 4380286 | Indicator 4380288 |

FIG. 438-11

| Package | level 1 | level 2 | level 3 | level 4 | level 5 | level 6 | level 7 | Cardinality | Datatype Name |
|---|---|---|---|---|---|---|---|---|---|
| | | | | Planned Delivery-Date 4380290 | | | | 1 4380292 | Date 4380294 |
| | | | | Con-firmed-Delivery-Date 4380296 | | | | 0..1 4380298 | Date 4380300 |
| | | | | Planned Quantity 4380302 | | | | 1 4380304 | Quantity 4380306 |
| | | | | Expected ScrapQu antity 4380308 | | | | 0..1 4380310 | Quantity 4380312 |
| | | | | Delivered Quantity 4380314 | | | | 0..1 4380316 | Quantity 4380318 |

FIG. 438-12

| Package | level 1 | level 2 | level 3 | level 4 | level 5 | level 6 | level 7 | Cardinality | Datatype Name |
|---|---|---|---|---|---|---|---|---|---|
| Sequence 4380320 | | | Sequence 4380322 | | | | | 1..n 4380324 | |
| | | | | ID 4380326 | | | | 1 4380328 | ProductionOrderSequenceID 4380330 |
| | | | | BranchingOperationID 4380332 | | | | 0..1 4380334 | OperationID 4380336 |
| | | | | ReturningOperationID 4380338 | | | | 0..1 4380340 | OperationID 4380342 |
| | | | | ProductionBillOfOperationsGroupID 4380344 | | | | 0..1 4380346 | ProductionBillOfOperationsGroupID 4380348 |

FIG. 438-13

| Package | level 1 | level 2 | level 3 | level 4 | level 5 | level 6 | level 7 | Cardinality | Datatype Name |
|---|---|---|---|---|---|---|---|---|---|
| | | | | ProductionBillOfOperationsID 4380350 | | | | 0..1 4380352 | ProductionBillOfOperationsID 4380354 |
| | | | | ProductionBillOfOperationsTypeCode 4380356 | | | | 0..1 4380358 | ProductionBillOfOperationsTypeCode 4380360 |
| | | | | CategoryCode 4380362 | | | | 1 4380364 | ProductionOrderSequenceCategoryCode 4380366 |

FIG. 438-14

| Package | level 1 | level 2 | level 3 | level 4 | level 5 | level 6 | level 7 | Cardinality | Datatype Name |
|---|---|---|---|---|---|---|---|---|---|
| | | | | Category Name 4380368 | | | | 1 4380370 | Produc-tionOr-derSe-quence-Cate-goryNam e 4380372 |
| | | | | Descrip-tion 4380374 | | | | 0..1 4380376 | SHORT_ descrip-tion 4380378 |
| | | | | Lot-SizeMini-mum-Quantity 4380380 | | | | 0..1 4380382 | Quantity 4380384 |

FIG. 438-15

| Package | level 1 | level 2 | level 3 | level 4 | level 5 | level 6 | level 7 | Cardinality | Datatype Name |
|---|---|---|---|---|---|---|---|---|---|
| | | | | LotSize-Maximum Quantity 4380386 | | | | 0..1 4380388 | Quantity 4380390 |
| Opera-tion 4380392 | | | | Opera-tion 4380394 | | | | 1..n 4380396 | |
| | | | | | ID 4380398 | | | 1 4380400 | Opera-tionID 4380402 |
| | | | | | Sequen-ceID 4380404 | | | 1 4380406 | Produc-tionOr-derSe-quenceID 4380408 |
| | | | | | Produc-tionCon-firmation-GroupID 4380410 | | | 1 4380412 | Produc-tionCon-firma-tionGroup ID 4380414 |

FIG. 438-16

| Package | level 1 | level 2 | level 3 | level 4 | level 5 | level 6 | level 7 | Cardinality | Datatype Name |
|---|---|---|---|---|---|---|---|---|---|
| | | | | | PurchaseRequestID 4380416 | | | 0..1 4380418 | PurchaseRequestID 4380420 |
| | | | | | PurchaseRequestItemID 4380422 | | | 0..1 4380424 | PurchaseRequestItemID 4380426 |
| | | | | | WorkCentreID 4380428 | | | 0..1 4380430 | WorkCentre ID 4380432 |
| | | | | | PlantID 4380434 | | | 1 4380436 | PlantID 4380438 |
| | | | | | FirstProductionResourceClassID 4380440 | | | 0..1 4380442 | ResourceClassID 4380444 |

FIG. 438-17

| Package | level 1 | level 2 | level 3 | level 4 | level 5 | level 6 | level 7 | Cardinality | Datatype Name |
|---|---|---|---|---|---|---|---|---|---|
| | | | | | Second-ProductionResourceClassID 4380446 | | | 0..1 4380448 | ResourceClassID 4380450 |
| | | | | | Third-ProductionResourceClassID 4380452 | | | 0..1 4380454 | ResourceClassID 4380456 |
| | | | | | Fourth-ProductionResourceClassID 4380458 | | | 0..1 4380460 | ResourceClassID 4380462 |

FIG. 438-18

| Package | level 1 | level 2 | level 3 | level 4 | level 5 | level 6 | level 7 | Cardinality | Datatype Name |
|---|---|---|---|---|---|---|---|---|---|
| | | | | | FifthProduction-ResourceClassID 4380464 | | | 0..1 4380466 | ResourceClassID 4380468 |
| | | | | | SixthProduction-ResourceClassID 4380470 | | | 0..1 4380472 | ResourceClassID 4380474 |
| | | | | | ProductionBillOfOperations-GroupID 4380476 | | | 0..1 4380478 | ProductionBillOfOperations-GroupID 4380480 |
| | | | | | ProductionBillOfOperationsID 4380482 | | | 0..1 4380484 | ProductionBillOfOperationsID 4380486 |

FIG. 438-19

| Package | level 1 | level 2 | level 3 | level 4 | level 5 | level 6 | level 7 | Cardinality | Datatype Name |
|---|---|---|---|---|---|---|---|---|---|
| | | | | | ProductionBillOfOperationsTypeCode 4380488 | | | 0..1 4380490 | ProductionBillOfOperationsTypeCode 4380492 |
| | | | | | ControlProfileCode 4380494 | | | 1 4380496 | OperationControlProfileCode 4380498 |
| | | | | | ControlProfileName 4380500 | | | 1 4380502 | OperationControlProfileName 4380504 |
| | | | | | WorkCentreName 4380506 | | | 0..1 4380508 | WorkCentreName 4380510 |

FIG. 438-20

| Package | level 1 | level 2 | level 3 | level 4 | level 5 | level 6 | level 7 | Cardinality | Datatype Name |
|---|---|---|---|---|---|---|---|---|---|
| | | | | | Description 4380512 | | | 0..1 4380514 | SHORT_Description 4380516 |
| | | | | | AdditionalDescription 4380518 | | | 0..1 4380520 | SHORT_Description 4380522 |
| | | | | | ProductionConfirmationNumberValue 4380524 | | | 0..1 4380526 | NumberValue 4380528 |
| | | | | | EarliestScheduledExecutionStartDateTime 4380530 | | | 0..1 4380532 | DateTime 4380534 |

FIG. 438-21

| Package | level 1 | level 2 | level 3 | level 4 | level 5 | level 6 | level 7 | Cardinality | Datatype Name |
|---|---|---|---|---|---|---|---|---|---|
| | | | | | Earliest-Sched-uled-Process-ingStart-DateTime 4380536 | | | 0..1 4380538 | DateTime 4380540 |
| | | | | | Earliest-Sched-uledTear-down-Start-DateTime 4380542 | | | 0..1 4380544 | DateTime 4380546 |
| | | | | | Earliest-Schedule dExecu-tionEnd-DateTime 4380548 | | | 0..1 4380550 | DateTime 4380552 |

FIG. 438-22

| Package | level 1 | level 2 | level 3 | level 4 | level 5 | level 6 | level 7 | Cardinality | Datatype Name |
|---|---|---|---|---|---|---|---|---|---|
| | | | | | Latest-ScheduledExecution-DateTime Period 4380554 | | | 0..1 4380556 | DateTime 4380558 |
| | | | | | Latest-Scheduled-Processing-Start-DateTime 4380560 | | | 0..1 4380562 | DateTime 4380564 |
| | | | | | Latest-ScheduledTear-down-Start-DateTime 4380566 | | | 0..1 4380568 | DateTime 4380570 |

FIG. 438-23

| Package | level 1 | level 2 | level 3 | level 4 | level 5 | level 6 | level 7 | Cardinality | Datatype Name |
|---|---|---|---|---|---|---|---|---|---|
| | | | | | Latest-ScheduledExecu-tionEnd-DateTime 4380572 | | | 0..1 4380574 | DateTime 4380576 |
| | | | | | Planned-Quantity 4380578 | | | 0..1 4380580 | Quantity 4380582 |
| | | | | | ExpectedScrapQuantity 4380584 | | | 0..1 4380586 | Quantity 4380588 |
| | | | | | Prede-cessor-Succes-sorRela-tionship 4380590 | | | 0…n 4380592 | |

FIG. 438-24

| Package | level 1 | level 2 | level 3 | level 4 | level 5 | level 6 | level 7 | Cardinality | Datatype Name |
|---|---|---|---|---|---|---|---|---|---|
| | | | | | | Predecessor 4380594 | | 0…n 4380596 | |
| | | | | | | | ProductionOrderID 4380598 | 1 4380600 | ProductionOrderID 4380602 |
| | | | | | | | SequenceID 4380604 | 1 4380606 | ProductionOrderSequenceID 4380608 |
| | | | | | | | OperationID 4380610 | 1 4380612 | OperationID 4380614 |
| | | | | | | Successor 4380616 | | 0…n 4380618 | |
| | | | | | | | ProductionOrderID 4380620 | 1 4380622 | ProductionOrderID 4380624 |

FIG. 438-25

| Package | level 1 | level 2 | level 3 | level 4 | level 5 | level 6 | level 7 | Cardinality | Datatype Name |
|---|---|---|---|---|---|---|---|---|---|
| | | | | | | | SequenceID 4380626 | 1 4380628 | ProductionOrderSequenceID 4380630 |
| | | | | | | | OperationID 4380632 | 1 4380634 | OperationID 4380636 |
| | | | | | MaterialInput 4380638 | | | 0...n 4380640 | |
| | | | | | | MaterialID 4380642 | | 1 4380644 | ProductID 4380646 |
| | | | | | | PlantID 4380648 | | 1 4380650 | PlantID 4380652 |
| | | | | | | InventoryManagedLocationInternalID 4380654 | | 1 4380656 | LocationInternalID 4380658 |

FIG. 438-26

| Package | level 1 | level 2 | level 3 | level 4 | level 5 | level 6 | level 7 | Cardinality | Datatype Name |
|---|---|---|---|---|---|---|---|---|---|
| | | | | | | BatchID 4380660 | | 0..1 4380662 | BatchID 4380664 |
| | | | | | | Reserva-tionID 4380666 | | 1 4380668 | Reserva-tionID 4380670 |
| | | | | | | Reserva-tionItemID 4380672 | | 1 4380674 | Reserva-tionItemID 4380676 |
| | | | | | | Pur-chaseRe-questID 4380678 | | 0..1 4380680 | Pur-chaseRe-questID 4380682 |
| | | | | | | Pur-chaseRe-ques-tItemID 4380684 | | 0..1 4380686 | Pur-chaseRe-ques-tItemID 4380688 |

FIG. 438-27

| Package | level 1 | level 2 | level 3 | level 4 | level 5 | level 6 | level 7 | Cardinality | Datatype Name |
|---|---|---|---|---|---|---|---|---|---|
| | | | | | | SequenceID 4380690 | | 1 4380692 | ProductionOrderSequenceID 4380694 |
| | | | | | | OperationID 4380696 | | 1 4380698 | OperationID 4380700 |
| | | | | | | LogisticsAreaID 4380702 | | 0..1 4380704 | LogisticsAreaID 4380706 |
| | | | | | | LogisticsAreaTypeCode 4380708 | | 0..1 4380710 | LogisticsAreaTypeCode 4380712 |
| | | | | | | LogisticsAreaTypeName 4380714 | | 0..1 4380716 | LogisticsAreaTypeName 4380718 |

FIG. 438-28

| Package | level 1 | level 2 | level 3 | level 4 | level 5 | level 6 | level 7 | Cardinality | Datatype Name |
|---|---|---|---|---|---|---|---|---|---|
| | | | | | | Logis-ticsReser-vatio-nItemRe-cordType-Code 4380720 | | 0..1 4380722 | Logis-ticsRe-servatio-nItemRe-cord-TypeCod e 4380724 |
| | | | | | | Logis-ticsReser-vatio-nItemRe-cord-TypeName 4380726 | | 0..1 4380728 | Logis-ticsRe-servatio-nItemRe-cord-TypeNam e 4380730 |
| | | | | | | GoodsMov ement-TypeCode 4380732 | | 1 4380734 | GoodsMo vement-Type-Code 4380736 |

FIG. 438-29

| Package | level 1 | level 2 | level 3 | level 4 | level 5 | level 6 | level 7 | Cardinality | Datatype Name |
|---|---|---|---|---|---|---|---|---|---|
| | | | | | | GoodsMovement-TypeName 4380738 | | 1 4380740 | GoodsMovement-TypeName 4380742 |
| | | | | | | Logistic-sItem-TypeCode 4380744 | | 1 4380746 | Logistic-sItem-Type-Code 4380748 |
| | | | | | | Logistic-sItem-TypeName 4380750 | | 1 4380752 | Logistic-sItem-TypeName 4380754 |
| | | | | | | Inven-torySpe-cialStock-TypeCode 4380756 | | 0..1 4380758 | Inven-torySpe-cial-StockTypeCode 4380760 |

FIG. 438-30

| Package | level 1 | level 2 | level 3 | level 4 | level 5 | level 6 | level 7 | Cardinality | Datatype Name |
|---|---|---|---|---|---|---|---|---|---|
| | | | | | | Inven-torySpe-cialStock-TypeName 4380762 | | 0..1 4380764 | Inven-torySpe-cial-StockTyp eName 4380766 |
| | | | | | | Inven-torySpe-cialStock-Valuation-TypeCode 4380768 | | 0..1 4380770 | Inven-torySpe-cial-StockValu ationType Code 4380772 |
| | | | | | | Inven-torySpe-cialStock-Valuation-TypeName 4380774 | | 0..1 4380776 | Inven-torySpe-cial-StockValu a-tionTypeN ame 4380778 |

FIG. 438-31

| Package | level 1 | level 2 | level 3 | level 4 | level 5 | level 6 | level 7 | Cardinality | Datatype Name |
|---|---|---|---|---|---|---|---|---|---|
| | | | | | | MaterialDescription 4380780 | | 0..1 4380782 | ProductDescription 4380784 |
| | | | | | | BackflushIndicator 4380786 | | 0..1 4380788 | Indicator 4380790 |
| | | | | | | DeletedIndicator 4380792 | | 0..1 4380794 | Indicator 4380796 |
| | | | | | | RequirementDate 4380798 | | 1 4380800 | Date 4380802 |
| | | | | | | RequirementQuantity 4380804 | | 0..1 4380806 | Quantity 4380808 |
| | | | | | | EntryQuantity 4380810 | | 0..1 4380812 | Quantity 4380814 |

FIG. 438-32

| Package | level 1 | level 2 | level 3 | level 4 | level 5 | level 6 | level 7 | Cardinality | Datatype Name |
|---|---|---|---|---|---|---|---|---|---|
| | | | | | | Issued-Quantity 4380816 | | 0..1 4380818 | Quantity 4380820 |
| | | | | | | Available-Quantity 4380822 | | 0..1 4380824 | Quantity 4380826 |
| | | | | | | Short-ageQuan-tity 4380828 | | 0..1 4380830 | Quantity 4380832 |
| | | | | | Materia-lOutput 4380834 | | | 0...n 4380836 | |
| | | | | | | MaterialID 4380838 | | 1 4380840 | ProductID 4380842 |
| | | | | | | PlantID 4380844 | | 1 4380846 | PlantID 4380848 |

FIG. 438-33

| Package | level 1 | level 2 | level 3 | level 4 | level 5 | level 6 | level 7 | Cardinality | Datatype Name |
|---|---|---|---|---|---|---|---|---|---|
| | | | | | | Inventory-Managed-LocationIn-ternalID 4380850 | | 1 4380852 | Location-InternalID 4380854 |
| | | | | | | BatchID 4380856 | | 0..1 4380858 | BatchID 4380860 |
| | | | | | | Reserva-tionID 4380862 | | 1 4380864 | Reserva-tionID 4380866 |
| | | | | | | Reserva-tionItemID 4380868 | | 1 4380870 | Reserva-tionItemID 4380872 |
| | | | | | | Sequen-ceID 4380874 | | 1 4380876 | Produc-tionOr-derSe-quenceID 4380878 |
| | | | | | | Opera-tionID 4380880 | | 1 4380882 | Opera-tionID 4380884 |

FIG. 438-34

| Package | level 1 | level 2 | level 3 | level 4 | level 5 | level 6 | level 7 | Cardinality | Datatype Name |
|---|---|---|---|---|---|---|---|---|---|
| | | | | | | GoodsMovement-TypeCode 4380886 | | 1 4380888 | GoodsMovement-Type-Code 4380890 |
| | | | | | | GoodsMovement-TypeName 4380892 | | 1 4380894 | GoodsMovement-TypeName 4380896 |
| | | | | | | Logistic-sItem-TypeCode 4380898 | | 1 4380900 | Logistic-sItem-Type-Code 4380902 |
| | | | | | | Logistic-sItem-TypeName 4380904 | | 1 4380906 | Logistic-sItem-TypeName 4380908 |

FIG. 438-35

| Package | level 1 | level 2 | level 3 | level 4 | level 5 | level 6 | level 7 | Cardinality | Datatype Name |
|---|---|---|---|---|---|---|---|---|---|
| | | | | | | Inven-torySpe-cialStock-TypeCode 4380910 | | 0..1 4380912 | Inven-torySpe-cialStock-Type-Code 4380914 |
| | | | | | | Inven-torySpe-cialStock-TypeName 4380916 | | 0..1 4380918 | Inven-torySpe-cialStock-TypeNam e 4380920 |
| | | | | | | Inven-torySpe-cialStock-Valuation-TypeCode 4380922 | | 0..1 4380924 | Inven-torySpe-cialStock-Valua-tionType-Code 4380926 |

FIG. 438-36

| Package | level 1 | level 2 | level 3 | level 4 | level 5 | level 6 | level 7 | Cardinality | Datatype Name |
|---|---|---|---|---|---|---|---|---|---|
| | | | | | | InventorySpecialStockValuationTypeName 4380928 | | 0..1 4380930 | InventorySpecialStockValuationTypeName 4380932 |
| | | | | | | MaterialDescription 4380934 | | 0..1 4380936 | ProductDescription 4380938 |
| | | | | | | BackflushIndicator 4380940 | | 0..1 4380942 | Indicator 4380944 |
| | | | | | | DeletedIndicator 4380946 | | 0..1 4380948 | Indicator 4380950 |

FIG. 438-37

| Package | level 1 | level 2 | level 3 | level 4 | level 5 | level 6 | level 7 | Cardinality | Datatype Name |
|---|---|---|---|---|---|---|---|---|---|
| | | | | | | RequirementDate 4380952 | | 1 4380954 | Date 4380956 |
| | | | | | | RequirementQuantity 4380958 | | 0..1 4380960 | Quantity 4380962 |
| | | | | | | EntryQuantity 4380964 | | 0..1 4380966 | Quantity 4380968 |
| | | | | | | IssuedQuantity 4380970 | | 0..1 4380972 | Quantity 4380974 |
| | | | | | EventTriggerPoint 4380976 | | | 0..n 4380978 | |

FIG. 438-38

| Package | level 1 | level 2 | level 3 | level 4 | level 5 | level 6 | level 7 | Cardinality | Datatype Name |
|---|---|---|---|---|---|---|---|---|---|
| | | | | | | ProductionEvent-TriggerPointID 4380980 | | 1 4380982 | ProductionEvent-TriggerPointID 4380984 |
| | | | | | | OperationID 4380986 | | 1 4380988 | OperationID 4380990 |
| | | | | | | DeletedIndicator 4380992 | | 0..1 4380994 | Indicator 4380996 |
| | | | | | | EventAllowedIndicator 4380998 | | 0..1 43801000 | Indicator 43801002 |
| | | | | | | ValidityStartDate 43801004 | | 1 43801006 | Date 43801008 |

FIG. 438-39

| Package | level 1 | level 2 | level 3 | level 4 | level 5 | level 6 | level 7 | Cardinality | Datatype Name |
|---|---|---|---|---|---|---|---|---|---|
| | | | | | | Syste-mAdminis-trativeData 43801010 | | 1 43801012 | DATE_SystemAd-ministra-tiveData 43801014 |
| Log 43801016 | | Log 43801018 | | | | | | 1 43801020 | Log 43801022 |

FIG. 439-1

| Package | level 1 | level 2 | level 3 | level 4 | Cardinality | Datatype Name |
|---|---|---|---|---|---|---|
| ProductionOrderSimpleByElementsQueryMessage 439000 | ProductionOrderSimpleByElementsQueryMessage 439002 | | | | | ProductionOrderSimpleByElementsQueryMessage 439004 |
| MessageHeader 439006 | | MessageHeader 439008 | | | 0..1 439010 | BasicBusinessDocumentMessageHeader 439012 |
| ProductionOrderSimpleSelectionByElements 439014 | | ProductionOrderSimpleSelectionByElements 439016 | | | 1 439018 | |

FIG. 439-2

| Package | level 1 | level 2 | level 3 | level 4 | Cardinality | Datatype Name |
|---|---|---|---|---|---|---|
| | | | ERPProductionOrderRequiredIndicator 439020 | | 1 439022 | Indicator 439024 |
| | | | ERPProcessOrderRequiredIndicator 439026 | | 1 439028 | Indicator 439030 |
| | | | SelectionByPlantID 439032 | | 0..n 439034 | |
| | | | | InclusionExclusionCode 439036 | 1 439038 | |
| | | | | IntervalBoundaryTypeCode 439040 | 1 439042 | |

FIG. 439-3

| Package | level 1 | level 2 | level 3 | level 4 | Cardinality | Datatype Name |
|---|---|---|---|---|---|---|
| | | | | LowerBoundary-PlantID 439044 | 1 439046 | PlantID 439048 |
| | | | | UpperBoundary-PlantID 439050 | 0..1 439052 | PlantID 439054 |
| | | | SelectionBy-SupplyPlan-ningAreaID 439056 | | 0..n 439058 | |
| | | | | InclusionExclu-sionCode 439060 | 1 439062 | |
| | | | | IntervalBound-aryTypeCode 439064 | 1 439066 | |
| | | | | LowerBoundary-SupplyPlannin-gAreaID 439068 | 1 439070 | Supply-PlanningA-reaID 439072 |

FIG. 439-4

| Package | | level 1 | level 2 | level 3 | level 4 | Cardinality | Datatype Name |
|---|---|---|---|---|---|---|---|
| | | | | | UpperBoundary-SupplyPlannin-gAreaID 439074 | 0..1 439076 | Supply-PlanningA-reaID 439078 |
| | | | | SelectionBy-MaterialID 439080 | | 0..n 439082 | |
| | | | | | InclusionExclu-sionCode 439084 | 1 439086 | |
| | | | | | IntervalBound-aryTypeCode 439088 | 1 439090 | |
| | | | | | LowerBound-aryMaterialID 439092 | 1 439094 | Product-InternalID 439096 |
| | | | | | UpperBound-aryMaterialID 439098 | 0..1 4390100 | Product-InternalID 4390102 |

FIG. 439-5

| Package | | level 1 | level 2 | level 3 | level 4 | Cardinality | Datatype Name |
|---|---|---|---|---|---|---|---|
| | | | | SelectionByMaterialRequirementsPlanningControllerID 4390104 | | 0..n 4390106 | |
| | | | | | InclusionExclusionCode 4390108 | 1 4390110 | |
| | | | | | IntervalBoundaryTypeCode 4390112 | 1 4390114 | |
| | | | | | LowerBoundaryMaterialRequirementsPlanningControllerID 4390116 | 1 4390118 | PartyInternalID 4390120 |

FIG. 439-6

| Package | | level 1 | level 2 | level 3 | level 4 | Cardinality | Datatype Name |
|---|---|---|---|---|---|---|---|
| | | | | | UpperBoundaryMaterialRequirementsPlanningControllerID 4390122 | 0..1 4390124 | PartyInternalID 4390126 |
| | | | | SelectionByProductionSchedulerID 4390128 | | 0..n 4390130 | |
| | | | | | InclusionExclusionCode 4390132 | 1 4390134 | |
| | | | | | IntervalBoundaryTypeCode 4390136 | 1 4390138 | |
| | | | | | LowerBoundaryProductionSchedulerID 4390140 | 1 4390142 | PartyInternalID 4390144 |

FIG. 439-7

| Package | level 1 | level 2 | level 3 | level 4 | Cardinality | Datatype Name |
|---|---|---|---|---|---|---|
| | | | | UpperBoundaryProduction-SchedulerID 4390146 | 0..1 4390148 | PartyInternalID 4390150 |
| | | | SelectionBy-SalesOrderID 4390152 | | 0..n 4390154 | |
| | | | | InclusionExclusionCode 4390156 | 1 4390158 | |
| | | | | IntervalBoundaryTypeCode 4390160 | 1 4390162 | |
| | | | | LowerBoundarySalesOrderID 4390164 | 1 4390166 | SalesOrderID 4390168 |
| | | | | UpperBoundarySalesOrderID 4390170 | 0..1 4390172 | SalesOrderID 4390174 |

FIG. 439-8

| Package | | level 1 | level 2 | level 3 | level 4 | Cardinality | Datatype Name |
|---|---|---|---|---|---|---|---|
| | | | | Selection-ByProject-WorkBreak-downStructu-reElement 4390176 | | 0..n 4390178 | |
| | | | | | InclusionExclu-sionCode 4390180 | 1 4390182 | |
| | | | | | IntervalBound-aryTypeCode 4390184 | 1 4390186 | |
| | | | | | LowerBound-aryProjectWork-BreakdownStruc-tureElementID 4390188 | 1 4390190 | Project-WorkBreak downStruc-tureEle-mentID 4390192 |

FIG. 439-9

| Package | | level 1 | level 2 | level 3 | level 4 | Cardinality | Datatype Name |
|---|---|---|---|---|---|---|---|
| | | | | | UpperBoundaryProjectWorkBreakdownStructureElementID 4390194 | 0..1 4390196 | ProjectWorkBreakdownStructureElementID 4390198 |
| | | | | SelectionByProductionOrderTypeCode 4390200 | | 0..n 4390202 | |
| | | | | | InclusionExclusionCode 4390204 | 1 4390206 | |
| | | | | | IntervalBoundaryTypeCode 4390208 | 1 4390210 | |

FIG. 439-10

| Package | level 1 | level 2 | level 3 | level 4 | Cardinality | Datatype Name |
|---|---|---|---|---|---|---|
| | | | | LowerBoundaryProductionOrderTypeCode 4390212 | 1 4390214 | ProductionOrderTypeCode 4390216 |
| | | | | UpperBoundaryProductionOrderTypeCode 4390218 | 0..1 4390220 | ProductionOrderTypeCode 4390222 |

FIG. 440

| Package | level 1 | level 2 | level 3 | Cardinality | Datatype Name |
|---|---|---|---|---|---|
| ProductionOrder-SimpleByElements-ResponseMessage 440000 | ProductionOrder-SimpleByEle-mentsResponse-Message 440002 | | | | ProductionOr-derSimpleByE-lementsRe-sponseMes-sage 440004 |
| Message-Header 440006 | | Message-Header 440008 | | 0..1 440010 | BasicBusi-nessDocu-mentMes-sageHeader 440012 |
| ProductionOr-der 440014 | | Produc-tionOrder 440016 | | 0..n 440018 | |
| | | | ID 440020 | 1 440022 | ProductionOr-derID 440024 |
| Log 440026 | | Log 440028 | | 1 440030 | Log 440032 |

FIG. 441-1

| Package | level 1 | level 2 | level 3 | level 4 | Cardinality | Datatype Name |
|---|---|---|---|---|---|---|
| ProductionOrder-SimpleByWorkCentreQueryMessage 441000 | ProductionOrderSimpleBy-WorkCentre-QueryMessage 441002 | | | | | ProductionOrderSimpleBy-WorkCentreQueryMessage 441004 |
| MessageHeader 441006 | | MessageHeader 441008 | | | 0..1 441010 | BasicBusiness-DocumentMessageHeader 441012 |
| ProductionOrderSimpleSelectionByWorkCentre 441014 | | ProductionOrder-SimpleSelection-ByWorkCentre 441016 | | | 1 441018 | |
| | | | ERPProductionOrderRequiredIndicator 441020 | | 1 441022 | Indicator 441024 |
| | | | ERPProcessOrderRequiredIndicator 441026 | | 1 441028 | Indicator 441030 |

FIG. 441-2

| Package | level 1 | level 2 | level 3 | level 4 | Cardinality | Datatype Name |
|---|---|---|---|---|---|---|
| | | | SelectionBy-WorkCentreID 441032 | | 0..n 441034 | |
| | | | | InclusionExclu-sionCode 441036 | 1 441038 | |
| | | | | IntervalBound-aryTypeCode 441040 | 1 441042 | |
| | | | | LowerBound-aryWorkCen-treID 441044 | 1 441046 | WorkCentreID 441048 |
| | | | | UpperBound-aryWorkCen-treID 441050 | 0..1 441052 | WorkCentreID 441054 |
| | | | SelectionBy-PlantID 441056 | | 0..n 441058 | |

FIG. 441-3

| Package | level 1 | level 2 | level 3 | level 4 | Cardinality | Datatype Name |
|---|---|---|---|---|---|---|
| | | | | InclusionExclusionCode 441060 | 1 441062 | |
| | | | | IntervalBoundaryTypeCode 441064 | 1 441066 | |
| | | | | LowerBoundaryPlantID 441068 | 1 441070 | PlantID 441072 |
| | | | | UpperBoundaryPlantID 441074 | 0..1 441076 | PlantID 441078 |

FIG. 442

| Package | level 1 | level 2 | level 3 | Cardinality | Datatype Name |
|---|---|---|---|---|---|
| ProductionOrderSimple-ByWorkCentreResponse-Message 442000 | ProductionOrder-SimpleByWork-CentreResponse-Message 442002 | | | | ProductionOr-derSimpleBy-WorkCentreRe-sponseMessage 442004 |
| MessageHeader 442006 | | MessageHeader 442008 | | 0..1 442010 | BasicBusiness-DocumentMes-sageHeader 442012 |
| ProductionOrder 442014 | | ProductionOrder 442016 | | 0..n 442018 | |
| | | | ID 442020 | 1 442022 | ProductionOrde-rID 442024 |
| Log 442026 | | Log 442028 | | 1 442030 | Log 442032 |

FIG. 448

| Package | level 1 | level 2 | level 3 | Cardinality | Datatype Name |
|---|---|---|---|---|---|
| ProductionPlanningOrderByIDQueryMessage_sync 448000 | ProductionPlanningOrderByIDQueryMessage_sync 448002 | | | 1 448004 | ProductionPlanningOrderByIDQueryMessage_sync 448006 |
| MessageHeader 448008 | | MessageHeader 448010 | | 0..1 448012 | BasicBusinessDocumentMessageHeader 448014 |
| ProductionPlanningOrderSelectionByID 448016 | | ProductionPlanningOrderSelectionByID 448018 | | 1 448020 | |
| | | | ID 448022 | 1 448024 | ProductionPlanningOrderID 448026 |

FIG. 449-1

| Package | level 1 | level 2 | level 3 | level 4 | Cardinality | Datatype Name |
|---|---|---|---|---|---|---|
| ProductionPlanningOrderByIDResponseMessage_sync 449000 | ProductionPlanningOrderByIDResponseMessage_sync 449002 | | | | 1 449004 | ProductionPlanningOrderByIDResponseMessage_sync 449006 |
| MessageHeader 449008 | | MessageHeader 449010 | | | 0..1 449012 | BasicBusinessDocumentMessageHeader 449014 |
| ProductionPlanningOrder 449016 | | ProductionPlanningOrder 449018 | | | 0..1 449020 | |
| | | | ID 449022 | | 1 449024 | ProductionPlanningOrderID 449026 |
| | | | MaterialInternalID 449028 | | 1 449030 | ProductInternalID 449032 |
| | | | SupplyPlanningAreaID 449034 | | 1 449036 | SupplyPlanningAreaID 449038 |

FIG. 449-2

| Package | level 1 | level 2 | level 3 | level 4 | Cardinality | Datatype Name |
|---|---|---|---|---|---|---|
| | | | PlantID 449040 | | 0..1 449042 | PlantID 449044 |
| | | | Inventory-ManagedLo-cationInter-nalID 449046 | | 0..1 449048 | LocationInternalID 449050 |
| | | | MaterialRe-quire-mentsSupply-PlanningA-realD 449052 | | 0..1 449054 | SupplyPlanningAreaID 449056 |
| | | | MaterialRe-quirements-PlanningCon-trollerID 449058 | | 0..1 449060 | PartyIntemalID 449062 |
| | | | SalesOrderID 449064 | | 1 449066 | SalesOrderID 449068 |

FIG. 449-3

| Package | level 1 | level 2 | level 3 | level 4 | Cardinality | Datatype Name |
|---|---|---|---|---|---|---|
| | | | SalesOrde-rItemID 449070 | | 1 449072 | SalesOrderItemID 449074 |
| | | | ProjectWork-Breakdown-StructureEle-mentID 449076 | | 1 449078 | ProjectWorkBreak-downStructureElemen-tID 449080 |
| | | | ReservationID 449082 | | 1 449084 | ReservationID 449086 |
| | | | Production-Master-DataExplo-sionDateID 449088 | | 0..1 449090 | ProductionMaster-DataExplosionDateID 449092 |
| | | | ProductionBil-lOfMaterial-VariantID 449094 | | 0..1 449096 | ProductionBillOfMateri-alVariantID 449098 |
| | | | SuperiorRe-servationID 4490100 | | 0..1 4490102 | ReservationID 4490104 |

FIG. 449-4

| Package | level 1 | level 2 | level 3 | level 4 | Cardinality | Datatype Name |
|---|---|---|---|---|---|---|
| | | | SuperiorRe-servatio-nItemID 4490106 | | 0..1 4490108 | ReservationItemID 4490110 |
| | | | Production-VersionID 4490112 | | 0..1 4490114 | ProductionVersionID 4490116 |
| | | | Production-SchedulerID 4490118 | | 0..1 4490120 | PartyInternalID 4490122 |
| | | | Requirement-sTotalRe-cordsReserva-tionID 4490124 | | 0..1 4490126 | ReservationID 4490128 |
| | | | Subcontract-ingVendorID 4490130 | | 0..1 4490132 | PartyInternalID 4490134 |
| | | | CapacityRe-quirementID 4490136 | | 0..1 4490138 | CapacityRequirementID 4490140 |

FIG. 449-5

| Package | level 1 | level 2 | level 3 | level 4 | Cardinality | Datatype Name |
|---|---|---|---|---|---|---|
| | | | ProductionBillOfOperationsGroupID 4490142 | | 0..1 4490144 | ProductionBillOfOperationsGroupID 4490146 |
| | | | ProductonBillOfOperationsID 4490148 | | 0..1 4490150 | ProductonBillOfOperationsID 4490152 |
| | | | ProcurementTypeCode 4490154 | | 1 4490156 | ProcurementTypeCode 4490158 |
| | | | ProcurementTypeName 4490160 | | 1 4490162 | ProcurementTypeName 4490164 |
| | | | AccountingCodingBlockTypeCode 4490166 | | 1 4490168 | AccountingCodingBlockTypeCode 4490170 |
| | | | AccountingCodingBlockTypeName 4490172 | | 1 4490174 | MEDIUM_name 4490176 |

FIG. 449-6

| Package | level 1 | level 2 | level 3 | level 4 | Cardinality | Datatype Name |
|---|---|---|---|---|---|---|
| | | | InventorySpecialStockTypeCode 4490178 | | 0..1 4490180 | InventorySpecialStockTypeCode 4490182 |
| | | | InventorySpecialStockTypeName 4490184 | | 0..1 4490186 | InventorySpecialStockTypeName 4490188 |
| | | | ProductionBillOfMaterialVariantUsageCode 4490190 | | 0..1 4490192 | ProductionBillOfMaterialVariantUsageCode 4490194 |
| | | | ProductionBillOfMaterialVariantUsageName 4490196 | | 0..1 4490198 | ProductionBillOfMaterialVariantUsageName 4490200 |
| | | | ProductAvailabilityConfirmationStatusCode 4490202 | | 0..1 4490204 | ProductAvailabilityConfirmationStatusCode 4490206 |

FIG. 449-7

| Package | level 1 | level 2 | level 3 | level 4 | Cardinality | Datatype Name |
|---|---|---|---|---|---|---|
| | | | ProductAvailabilityConfirmationStatusName 4490208 | | 0..1 4490210 | MEDIUM_name 4490212 |
| | | | AvailabilityCheckTypeCode 4490214 | | 0..1 4490216 | ProductionPlanningOrderAvailabilityCheckTypeCode 4490218 |
| | | | AvailabilityCheckTypeName 4490220 | | 0..1 4490222 | ProductionPlanningOrderAvailabilityCheckTypeName 4490224 |
| | | | InventorySpecialStockValuationTypeCode 4490226 | | 0..1 4490228 | InventorySpecialStockValuationTypeCode 4490230 |
| | | | InventorySpecialStockValuationTypeName 4490232 | | 0..1 4490234 | InventorySpecialStockValuationTypeName 4490236 |

FIG. 449-8

| Package | level 1 | level 2 | level 3 | level 4 | Cardinality | Datatype Name |
|---|---|---|---|---|---|---|
| | | | ProductionBil-lOfOperation-sTypeCode 4490238 | | 0..1 4490240 | ProductionBillOfOpera-tionsTypeCode 4490242 |
| | | | ProductionBil-lOfOperation-sTypeName 4490244 | | 0..1 4490246 | ProductionBillOfOpera-tionsTypeName 4490248 |
| | | | LogisticsS-cheduling-TypeCode 4490250 | | 0..1 4490252 | LogisticsScheduling-TypeCode 4490254 |
| | | | LogisticsS-cheduling-TypeName 4490256 | | 0..1 4490258 | LogisticsScheduling-TypeName 4490260 |
| | | | LogisticsS-chedulingRe-sultCode 4490262 | | 0..1 4490264 | LogisticsSchedulingRe-sultCode 4490266 |

FIG. 449-9

| Package | level 1 | level 2 | level 3 | level 4 | Cardinality | Datatype Name |
|---|---|---|---|---|---|---|
| | | | LogisticsSchedulingResultName 4490268 | | 0..1 4490270 | LogisticsSchedulingResultName 4490272 |
| | | | ConvertIndicator 4490274 | | 1 4490276 | Indicator 4490278 |
| | | | FixedIndicator 4490280 | | 1 4490282 | Indicator 4490284 |
| | | | BillOfMaterialExplosionFixedIndicator 4490286 | | 1 4490288 | Indicator 4490290 |
| | | | CapacityDispatchedIndicator 4490292 | | 0..1 4490294 | Indicator 4490296 |
| | | | AssemblyOrderProcessingUsedIndicator 4490298 | | 0..1 4490300 | Indicator 4490302 |

FIG. 449-10

| Package | level 1 | level 2 | level 3 | level 4 | Cardinality | Datatype Name |
|---|---|---|---|---|---|---|
| | | | CollectiveOr-derLeadingIn-dicator 4490304 | | 0..1 4490306 | Indicator 4490308 |
| | | | Require-mentsSum-marydIndica-tor 4490310 | | 0..1 4490312 | Indicator 4490314 |
| | | | Repetitive-Manufacturin-gUsedIndica-tor 4490316 | | 0..1 4490318 | Indicator 4490320 |
| | | | KanbanRe-plenishmen-tElemen-tRoleIndicator 4490322 | | 0..1 4490324 | Indicator 4490326 |
| | | | BasicStart-Date 4490328 | | 1 4490330 | Date 4490332 |

FIG. 449-11

| Package | level 1 | level 2 | level 3 | level 4 | Cardinality | Datatype Name |
|---|---|---|---|---|---|---|
| | | | BasicEndDate 4490334 | | 1 4490336 | Date 4490338 |
| | | | PlannedOpen-ingDate 4490340 | | 0..1 4490342 | Date 4490344 |
| | | | Production-Master-DataExplo-sionDate 4490346 | | 0..1 4490348 | Date 4490350 |
| | | | TotalAvailabili-tyDate 4490352 | | 0..1 4490354 | Date 4490356 |
| | | | Scheduled-StartDateTime 4490358 | | 0..1 4490360 | DateTime 4490362 |
| | | | ScheduledEnd DateTime 4490364 | | 0..1 4490366 | DateTime 4490368 |

FIG. 449-12

| Package | level 1 | level 2 | level 3 | level 4 | Cardinality | Datatype Name |
|---|---|---|---|---|---|---|
| | | | Sequence-Planning-StartDateTime 4490370 | | 0..1 4490372 | DateTime 4490374 |
| | | | Sequence-PlanningEnd-DateTime 4490376 | | 0..1 4490378 | DateTime 4490380 |
| | | | PlannedTo-talQuantity 4490382 | | 1 4490384 | Quantity 4490386 |
| | | | Expected-ScrapQuantity 4490388 | | 1 4490390 | Quantity 4490392 |
| | | | Delivered-Quantity 4490394 | | 0..1 4490396 | Quantity 4490398 |
| | | | IssuedQuan-tity 4490400 | | 0..1 4490402 | Quantity 4490404 |
| InputMaterial 4490406 | | | InputMaterial 4490408 | | 0..n 4490410 | InputMaterial 4490412 |

FIG. 449-13

| Package | level 1 | level 2 | level 3 | level 4 | Cardinality | Datatype Name |
|---|---|---|---|---|---|---|
| | | | | MaterialInter-nalID 4490414 | 1 4490416 | ProductInternalID 4490418 |
| | | | | PlantID 4490420 | 1 4490422 | PlantID 4490424 |
| | | | | Inventory-ManagedLo-cationInter-nalID 4490426 | 0..1 4490428 | LocationInternalID 4490430 |
| | | | | ProductionBil-lOfMaterial-ItemID 4490432 | 0..1 4490434 | ProductionBillOfMateri-alItemID 4490436 |
| | | | | Engineering-ChangeRe-questID 4490438 | 0..1 4490440 | EngineeringChangeRe-questID 4490442 |
| | | | | Logistic-sAreaID 4490444 | 0..1 4490446 | LogisticsAreaID 4490448 |

FIG. 449-14

| Package | level 1 | level 2 | level 3 | level 4 | Cardinality | Datatype Name |
|---|---|---|---|---|---|---|
| | | | | Logistic-sAreaType-Code 4490450 | 0..1 4490452 | LogisticsAreaTypeCode 4490454 |
| | | | | Logistic-sAreaTypeNa me 4490456 | 0..1 4490458 | Logistsic-sAreaTypeName 4490460 |
| | | | | LogisticsItem-TypeCode 4490462 | 1 4490464 | LogisticsItemTypeCode 4490466 |
| | | | | LogisticsItem-TypeName 4490468 | 1 4490470 | LogisticsItem-TypeName 4490472 |
| | | | | InventorySpe-cialStock-TypeCode 4490474 | 0..1 4490476 | InventorySpecialStock-TypeCode 4490478 |
| | | | | InventorySpe-cialStock-TypeName 4490480 | 0..1 4490482 | InventorySpecialStock-TypeName 4490484 |

FIG. 449-15

| Package | level 1 | level 2 | level 3 | level 4 | Cardinality | Datatype Name |
|---|---|---|---|---|---|---|
| | | | | Production-QuantityDis-tributionCode 4490486 | 0..1 4490488 | ProductionQuantityDis-tributionCode 4490490 |
| | | | | Production-QuantityDis-tributionName 4490492 | 0..1 4490494 | ProductionQuantityDis-tributionName 4490496 |
| | | | | MaterialRe-quirements-Planning-TypeCode 4490498 | 0..1 4490500 | MaterialRequirements-PlanningTypeCode 4490502 |
| | | | | MaterialRe-quirements-Planning-TypeName 4490504 | 0..1 4490506 | MaterialRequirements-PlanningTypeName 4490508 |
| | | | | MaterialDe-scription 4490510 | 0..1 4490512 | ProductDescription 4490514 |

FIG. 449-16

| Package | level 1 | level 2 | level 3 | level 4 | Cardinality | Datatype Name |
|---|---|---|---|---|---|---|
| | | | | PhantomAssemblyIndicator 4490516 | 0..1 4490518 | Indicator 4490520 |
| | | | | QuantityFixedIndicator 4490522 | 0..1 4490524 | Indicator 4490526 |
| | | | | RequirementDate 4490528 | 1 4490530 | Date 4490532 |
| | | | | LatestRequirementDate 4490534 | 0..1 4490536 | Date 4490538 |
| | | | | RequirementQuantity 4490540 | 1 4490542 | Quantity 4490544 |
| | | | | ExpectedScrapPercent 4490546 | 0..1 4490548 | Percent 4490550 |
| | | | | AvailableQuantity 4490552 | 0..1 4490554 | Quantity 4490556 |

FIG. 449-17

| Package | level 1 | level 2 | level 3 | level 4 | Cardinality | Datatype Name |
|---|---|---|---|---|---|---|
| OutputMaterial 4490558 | | | OutputMaterial 4490560 | | 1..n 4490562 | OutputMaterial 4490564 |
| | | | | MaterialInternalID 4490566 | 1 4490568 | ProductInternalID 4490570 |
| | | | | SupplyPlanningAreaID 4490572 | 1 4490574 | SupplyPlanningAreaID 4490576 |
| | | | | Inventory-ManagedLocationID 4490578 | 0..1 4490580 | LocationInternalID 4490582 |
| | | | | Engineering-ChangeRequestID 4490584 | 0..1 4490586 | EngineeringChangeRequestID 4490588 |
| | | | | InventorySpecialStock-TypeCode 4490590 | 0..1 4490592 | InventorySpecialStock-TypeCode 4490594 |

FIG. 449-18

| Package | level 1 | level 2 | level 3 | level 4 | Cardinality | Datatype Name |
|---|---|---|---|---|---|---|
| | | | | InventorySpecialStock-TypeName 4490596 | 0..1 4490598 | InventorySpecialStock-TypeName 4490600 |
| | | | | Production-QuantityDistributionCode 4490602 | 0..1 4490604 | ProductionQuantityDistributionCode 4490606 |
| | | | | Production-QuantityDistributionName 4490608 | 0..1 4490610 | ProductionQuantityDistributionName 4490612 |
| | | | | MaterialDescription 4490614 | 0..1 4490616 | ProductDescription 4490618 |
| | | | | PhantomAssemblyIndicator 4490620 | 0..1 4490622 | Indicator 4490624 |
| | | | | ReceiptDate 4490626 | 1 4490628 | Date 4490630 |

FIG. 449-19

| Package | level 1 | level 2 | level 3 | level 4 | Cardinality | Datatype Name |
|---|---|---|---|---|---|---|
| | | | | EarliestReceiptDate 4490632 | 0..1 4490634 | Date 4490636 |
| | | | | GoodsReceiptProcessingTime 4490638 | 0..1 4490640 | DateTimePeriod 4490642 |
| | | | | ReceiptQuantity 4490644 | 1 4490646 | Quantity 4490648 |
| | | | | Expected-ScrapQuantity 4490650 | 0..1 4490652 | Quantity 4490654 |
| | | | | Available-Quantity 4490656 | 0..1 4490658 | Quantity 4490660 |
| CapacityRequirement 4490662 | | | CapacityRequirement 4490664 | | 0..n 4490666 | CapacityRequirement 4490668 |

FIG. 449-20

| Package | level 1 | level 2 | level 3 | level 4 | Cardinality | Datatype Name |
|---|---|---|---|---|---|---|
| | | | | Production-PlanningOr-derSequen-ceID 4490670 | 1 4490672 | ProductionPlanningOr-derSequenceID 4490674 |
| | | | | OperationID 4490676 | 1 4490678 | OperationID 4490680 |
| | | | | OperationAc-tivityID 4490682 | 1 4490684 | OperationActivityID 4490686 |
| | | | | WorkCentreID 4490688 | 1 4490690 | WorkCentreID 4490692 |
| | | | | CapacityCate-goryCode 4490694 | 1 4490696 | CapacityCategoryCode 4490698 |
| | | | | CapacityCate-goryName 4490700 | 1 4490702 | CapacityCategoryName 4490704 |
| | | | | Operation-StartDate 4490706 | 1 4490708 | DateTime 4490710 |

FIG. 449-21

| Package | level 1 | level 2 | level 3 | level 4 | Cardinality | Datatype Name |
|---|---|---|---|---|---|---|
| | | | | Opera-tionEndDate 4490712 | 1 4490714 | DateTime 4490716 |
| | | | | Quantity 4490718 | 1 4490720 | Quantity 4490722 |
| Log 4490724 | | Log 4490726 | | | 1 4490728 | Log 4490730 |

FIG. 450-1

| Package | level 1 | level 2 | level 3 | level 4 | Cardinality | Datatype Name |
|---|---|---|---|---|---|---|
| ProductionPlanningOrderSimpleByElementsQueryMessage_sync 450000 | ProductionPlanningOrderSimpleByElementsQueryMessage_sync 450002 | | | | 1 450004 | ProductionPlanningOrderSimpleByElementsQueryMessage_sync 450006 |
| MessageHeader 450008 | | MessageHeader 450010 | | | 0..1 450012 | BasicBusinessDocumentMessageHeader 450014 |
| ProductionPlanningOrderSimpleSelectionByElements 450016 | | ProductionPlanningOrderSimpleSelectionByElements 450018 | | | 1 450020 | |
| | | | SelectionByMaterialInternalID 450022 | | 0..n 450024 | |
| | | | | InclusionExclusionCode 450026 | 1 450028 | InclusionExclusionCode 450030 |

FIG. 450-2

| Package | level 1 | level 2 | level 3 | level 4 | Cardinality | Datatype Name |
|---|---|---|---|---|---|---|
| | | | | Interval-Bound-aryType-Code 450032 | 1 450034 | IntervalBound-aryTypeCode 450036 |
| | | | | Lower-Boundary-MaterialIn-ternalID 450038 | 1 450040 | ProductInter-nalID 450042 |
| | | | | Upper-Boundary-MaterialIn-ternalID 450044 | 0..1 450046 | ProductInter-nalID 450048 |
| | | | SelectionBy-SupplyPlan-ningAreaID 450050 | | 0..n 450052 | |
| | | | | InclusionEx-clusionCode 450054 | 1 450056 | InclusionExclu-sionCode 450058 |

FIG. 450-3

| Package | level 1 | level 2 | level 3 | level 4 | Cardinality | Datatype Name |
|---|---|---|---|---|---|---|
| | | | | Interval-Bound-aryType-Code 450060 | 1 450062 | IntervalBound-aryTypeCode 450064 |
| | | | | Lower-Boundary-SupplyPlan-ningAreaID 450066 | 1 450068 | SupplyPlannin-gAreaID 450070 |
| | | | | Upper-Boundary-SupplyPlan-ningAreaID 450072 | 0..1 450074 | SupplyPlannin-gAreaID 450076 |
| | | | SelectionBy-MaterialRe-quirements-PlanningCon-trollerID 450078 | | 0..n 450080 | |
| | | | | InclusionEx-clusionCode 450082 | 1 450084 | InclusionExclu-sionCode 450086 |

FIG. 450-4

| Package | level 1 | level 2 | level 3 | level 4 | Cardinality | Datatype Name |
|---|---|---|---|---|---|---|
| | | | | Interval-Bound-aryType-Code 450088 | 1 450090 | IntervalBound-aryTypeCode 450092 |
| | | | | Lower-Boundary-MaterialRe-quirements-Planning-ControllerID 450094 | 1 450096 | PartyInternalID 450098 |
| | | | | Upper-Boundary-MaterialRe-quirements-Planning-ControllerID 4500100 | 0..1 4500102 | PartyInternalID 4500104 |
| | | | Selection-ByProduc-tionVersionID 4500106 | | 0..n 4500108 | |

FIG. 450-5

| Package | level 1 | level 2 | level 3 | level 4 | Cardinality | Datatype Name |
|---|---|---|---|---|---|---|
| | | | | InclusionExclusionCode 4500110 | 1 4500112 | InclusionExclusionCode 4500114 |
| | | | | IntervalBoundaryTypeCode 4500116 | 1 4500118 | IntervalBoundaryTypeCode 4500120 |
| | | | | LowerBoundaryProductionVersionID 4500122 | 1 4500124 | ProductionVersionID 4500126 |
| | | | | UpperBoundaryProductionVersionID 4500128 | 0..1 4500130 | ProductionVersionID 4500132 |
| | | | SelectionByBasicEndDate 4500134 | | 0..n 4500136 | |

FIG. 450-6

| Package | level 1 | level 2 | level 3 | level 4 | Cardinality | Datatype Name |
|---|---|---|---|---|---|---|
| | | | | InclusionExclusionCode 4500138 | 1 4500140 | InclusionExclusionCode 4500142 |
| | | | | IntervalBoundaryTypeCode 4500144 | 1 4500146 | IntervalBoundaryTypeCode 4500148 |
| | | | | LowerBoundaryBasicEndDate 4500150 | 1 4500152 | Date 4500154 |
| | | | | UpperBoundaryBasicEndDate 4500156 | 0..1 4500158 | Date 4500160 |

FIG. 451

| Package | level 1 | level 2 | level 3 | Cardinality | Datatype Name |
|---|---|---|---|---|---|
| ProductionPlanningOrder-SimpleByElementsRespon-seMessage_sync 451000 | ProductionPlannin-gOrderSimpleByE-lementsRespon-seMessage_sync 451002 | | | 1 451004 | ProductionPlanningOrderSimple-ByElementsResponseMes-sage_sync 451006 |
| MessageHeader 451008 | | MessageHeader 451010 | | 0..1 451012 | BasicBusinessDocumentMes-sageHeader 451014 |
| ProductionPlannin-gOrder 451016 | | ProductionPlannin-gOrder 451018 | | 0..n 451020 | |
| | | | ID 451022 | 1 451024 | ProductionPlanningOrderID 451026 |
| Log 451028 | | Log 451030 | | 1 451032 | Log 451034 |

FIG. 463-1

| Package | level 1 | level 2 | level 3 | level 4 | level 5 | level 6 | Cardinality | Datatype Name |
|---|---|---|---|---|---|---|---|---|
| ProductionPlanningOrdeByIDResponsetMessage_sync 463000 | ProductionPlanningOrderByIDResponseMessage_sync 463002 | | | | | | | ProductionPlanningOrderByIDResponseMessage_sync 463004 |
| MessageHeader 463006 | | MessageHeader 463008 | | | | | 1 463010 | BasicBusinessDocumentMessageHeader 463012 |
| ProductionPlanningOrder 463014 | | ProductionPlanningOrder 463016 | | | | | 0..1 463018 | |
| | | | ID 463020 | | | | 1 463022 | BusinessTransactionDocumentID 463024 |
| | | | PlanningVersionID 463026 | | | | 1 463028 | PlanningVersionID 463030 |

FIG. 463-2

| Package | | level 1 | level 2 | level 3 | level 4 | level 5 | level 6 | Cardinality | Datatype Name |
|---|---|---|---|---|---|---|---|---|---|
| | | | | Supply-PlanningAreaID 463032 | | | | 1 463034 | SupplyPlanningAreaID 463036 |
| | | | | ProductionModelID 463038 | | | | 0..1 463040 | ProductionModelID 463042 |
| | | | | SystemAdminstrativeData 463044 | | | | 1 463046 | SystemAdministrativeData 463048 |
| | | | | SourceOfSupplyExplosionDate 463050 | | | | 0..1 463052 | ExplosionDate 463054 |

FIG. 463-3

| Package | | level 1 | level 2 | level 3 | level 4 | level 5 | level 6 | Cardinality | Datatype Name |
|---|---|---|---|---|---|---|---|---|---|
| | | | | TypeCode 463056 | | | | 1 463058 | Business-Transaction-Document-TypeCode 463060 |
| | | | | Logis-ticsPlan-ningDe-tailLevel-Code 463062 | | | | 0..1 463064 | Logis-ticsPlanning-DetailLevel-Code 463066 |
| | | | | Valid-ityPeriod 463068 | | | | 1 463070 | ValidityUP-PEROPEN_LOCALNORMALISED_DateTimePeriod 463072 |

FIG. 463-4

| Package | | level 1 | level 2 | level 3 | level 4 | level 5 | level 6 | Cardinality | Datatype Name |
|---|---|---|---|---|---|---|---|---|---|
| | | | | Planned-Period 463074 | | | | 1 463076 | PlannedUP-PER-OPEN_LOCALNORMALISED_DateTimePeriod 463078 |
| | | | | Opening-DateTime 463080 | | | | 1 463082 | OpeningLO-CAL-NORMALSED_DateTime 463084 |
| | | | | FixedIndi-cator 463086 | | | | 0..1 463088 | FixedIndica-tor 463090 |
| | | | | Sour-ceOfSup-plyFixed-Indicator 463092 | | | | 0..1 463094 | FixedIndica-tor 463096 |

FIG. 463-5

| Package | level 1 | level 2 | level 3 | level 4 | level 5 | level 6 | Cardinality | Datatype Name |
|---|---|---|---|---|---|---|---|---|
| | | | Conver-sionAl-lowedIn-dicator 463098 | | | | 0..1 4630100 | AllowedIndi-cator 4630102 |
| | | | Material-Supply-AndDe-mand-Status-Code 4630104 | | | | 1 4630106 | PRODUCTION_MaterialSupplyAndDe-mandStatus-Code 4630108 |
| | | | LifeCy-cleS-tatusCode 4630110 | | | | 0..1 4630112 | Production-PlanningOr-derLifeCy-cleStatus-Code 4630114 |
| Operation 4630116 | | | Operation 4630118 | | | | 1..n 4630120 | |
| | | | | ID 4630122 | | | 1 4630124 | OperationID 4630126 |

FIG. 463-6

| Package | level 1 | level 2 | level 3 | level 4 | level 5 | level 6 | Cardinality | Datatype Name |
|---|---|---|---|---|---|---|---|---|
| | | | | Descrip-tion 4630128 | | | 0..1 4630130 | Operation-MEDIUM_Description 4630132 |
| | | | | Planned-Period 4630134 | | | 0..1 4630136 | PlannedUP-PERO-PEN_LOCALNORMALISED_DateTimePeriod 4630138 |
| | | | | Planned-Duration 4630140 | | | 0..1 4630142 | Planned-TIME_Duration 4630144 |
| | | | | FixedIndi-cator 4630146 | | | 0..1 4630148 | FixedIndica-tor 4630150 |

FIG. 463-7

| Package | level 1 | level 2 | level 3 | level 4 | level 5 | level 6 | Cardinality | Datatype Name |
|---|---|---|---|---|---|---|---|---|
| | | | | ProductionConfirmationRecordTypeCode 4630152 | | | 0..1 4630154 | ProductionConfirmationRecordTypeCode 4630156 |
| | | | | Alternative 4630158 | | | 1..n 4630160 | |
| | | | | | ID 4630162 | | 1 4630164 | OperationAlternativeID 4630166 |
| | | | | | ResourceID 4630168 | | 1 4630170 | ResourceID 4630172 |
| | | | | | ProcessingDuration 4630174 | | 0..1 4630176 | Processing-TIME_Duration 4630178 |

FIG. 463-8

| Package | level 1 | level 2 | level 3 | level 4 | level 5 | level 6 | Cardinality | Datatype Name |
|---|---|---|---|---|---|---|---|---|
| | | | | | Priority-Value 4630180 | | 1 4630182 | PriorityValue 4630184 |
| | | | | | ActiveIn-dicator 4630186 | | 1 4630188 | ActiveIndica-tor 4630190 |
| | | | | Activity 4630192 | | | 1..n 4630194 | |
| | | | | | Opera-tionID 4630196 | | 1 4630198 | OperationID 4630200 |
| | | | | | Opera-tionActiv-ityType-Code 4630202 | | 1 4630204 | OperationAc-tivityType-Code 4630206 |

FIG. 463-9

| Package | level 1 | level 2 | level 3 | level 4 | level 5 | level 6 | Cardinality | Datatype Name |
|---|---|---|---|---|---|---|---|---|
| | | | | | Engineering-ChangeOrderID 4630208 | | 0..1 4630210 | Engineering-ChangeOrde-rID 4630212 |
| | | | | | Process-ingDura-tion 4630214 | | 0..1 4630216 | Processing-TIME_Duration 4630218 |
| | | | | | Planned-Period 4630220 | | 0..1 4630222 | PlannedUP-PERO-PEN_LOCALNORMALISED_DateTimePeriod 4630224 |
| | | | | | FixedIn-dicator 4630226 | | 0..1 4630228 | FixedIndica-tor 4630230 |

FIG. 463-10

| Package | level 1 | level 2 | level 3 | level 4 | level 5 | level 6 | Cardinality | Datatype Name |
|---|---|---|---|---|---|---|---|---|
| | | | | | ProductionConfirmationRecordType Code 4630232 | | 0..1 4630234 | ProductionConfirmationRecordTypeCode 4630236 |
| | | | | | Relationship 4630238 | | 0..n 4630240 | |
| | | | | | | SuccessorOperationID 4630242 | 1 4630244 | SucessorOperationID 4630246 |
| | | | | | | SuccessorOperationActivityType-Code 4630248 | 1 4630250 | SucessorOperationActivityTypeCode 4630252 |

FIG. 463-11

| Package | level 1 | level 2 | level 3 | level 4 | level 5 | level 6 | Cardinality | Datatype Name |
|---|---|---|---|---|---|---|---|---|
| | | | | | | Network-PlanEle-mentSucsession-TypeCode 4630254 | 1 4630256 | Network-PlanEle-mentSucces-sionType-Code 4630258 |
| | | | | | | NetMini-mumDura-tion 4630260 | 0..1 4630262 | Minimum-TIME_Durati on 4630264 |
| | | | | | Proper-tyValua-tion 4630266 | | 0..n 4630268 | |
| | | | | | | PropertyID 4630270 | 1 4630272 | PropertyID 4630274 |
| | | | | | | Property-Value 4630276 | 1 4630278 | Property-Value 4630280 |

FIG. 463-12

| Package | level 1 | level 2 | level 3 | level 4 | level 5 | level 6 | Cardinality | Datatype Name |
|---|---|---|---|---|---|---|---|---|
| | | | | | | Property-Value-Name 4630282 | 0..1 4630284 | PropertyVal-ueME-DIUM_Name 4630286 |
| Capacity Require-ment 4630288 | | | Capac-ityRe-quirement 4630290 | | | | 1..n 4630292 | |
| | | | | Opera-tionAlter-nativeID 4630294 | | | 1 4630296 | OperationAl-ternativeID 4630298 |
| | | | | Opera-tionID 4630300 | | | 1 4630302 | OperationID 4630304 |
| | | | | Opera-tionActiv-ityType-Code 4630306 | | | 1 4630308 | OperationAc-tivityType-Code 4630310 |

FIG. 463-13

| Package | level 1 | level 2 | level 3 | level 4 | level 5 | level 6 | Cardinality | Datatype Name |
|---|---|---|---|---|---|---|---|---|
| | | | | Resour-ceID 4630312 | | | 1 4630314 | ResourceID 4630316 |
| | | | | Resour-ceType-Code 4630318 | | | 1 4630320 | Resour-ceTypeCode 4630322 |
| | | | | Process-ingDura-tion 4630324 | | | 0..1 4630326 | Processing-TIME_Durati on 4630328 |
| | | | | ActiveIn-dicator 4630330 | | | 0..1 4630332 | ActiveIndica-tor 4630334 |
| | | | | Planned-Period 4630336 | | | 0..1 4630338 | PlannedUP-PERO-PEN_LOCAL NORMALISE D_DateTime Period 4630340 |

FIG. 463-14

| Package | level 1 | level 2 | level 3 | level 4 | level 5 | level 6 | Cardinality | Datatype Name |
|---|---|---|---|---|---|---|---|---|
| | | | | Relation-ship 4630342 | | | 0..n 4630344 | |
| | | | | | Sucesso-rOpera-tionAlter-nativeID 4630346 | | 1 4630348 | SucessorOp-erationAlter-nativeID 4630350 |
| | | | | | | Successo-rOpera-tionID 4630352 | 1 4630354 | SucessorOp-erationID 4630356 |
| | | | | | | Successo-rOpera-tionActiv-ityType-Code 4630358 | 1 4630360 | Successo-rOperationAc-tivityType-Code 4630362 |
| | | | | | | Succes-sorResour-ceID 4630364 | 1 4630366 | Successor-ResourceID 4630368 |

FIG. 463-15

| Package | | | level 1 | level 2 | level 3 | level 4 | level 5 | level 6 | Cardinality | Datatype Name |
|---|---|---|---|---|---|---|---|---|---|---|
| | | | | | | | | Resour-ceType-Code 4630370 | 1 4630372 | Resour-ceTypeCode 4630374 |
| | | Compo-nent 4630376 | | | | Materia-lOutput 4630378 | | | 1..n 4630380 | |
| | | | | | | | ItemID 4630382 | | 0..1 4630384 | Business-Transaction-Documen-tItemID 4630386 |
| | | | | | | | Product-InternalID 4630388 | | 1 4630390 | ProductInter-nalID 4630392 |
| | | | | | | | Supply-Plannin-gAreaID 4630394 | | 1 4630396 | SupplyPlan-ningAreaID 4630398 |

FIG. 463-16

| Package | level 1 | level 2 | level 3 | level 4 | level 5 | level 6 | Cardinality | Datatype Name |
|---|---|---|---|---|---|---|---|---|
| | | | | | Inven-torySpe-cialStock-Type-Code 4630400 | | 0..1 4630402 | Inven-torySpecial-StockType-Code 4630404 |
| | | | | | Accoun-tAssign-mentOb-jectText 4630406 | | 0..1 4630408 | AccountAs-signmentOb-jectLAN-GUAGEINDE PENDENT_M EDIUM_Text 4630410 |
| | | | | | Material-Role-Code 4630412 | | 1 4630414 | MaterialOut-putMaterial-RoleCode 4630416 |

FIG. 463-17

| Package | level 1 | level 2 | level 3 | level 4 | level 5 | level 6 | Cardinality | Datatype Name |
|---|---|---|---|---|---|---|---|---|
| | | | | | Material-Supply-AndDe-mand-Type-Code 4630418 | | 1 4630420 | Material-SupplyAnd-Demand-TypeCode 4630422 |
| | | | | | Engineer-ing-ChangeO rderID 4630424 | | 0..1 4630426 | Engineering-ChangeOrde-rID 4630428 |
| | | | | | Opera-tionID 4630430 | | 1 4630432 | OperationID 4630434 |
| | | | | | Opera-tionActiv-ityType-Code 4630436 | | 1 4630438 | OperationAc-tivityType-Code 4630440 |

FIG. 463-18

| Package | level 1 | level 2 | level 3 | level 4 | level 5 | level 6 | Cardinality | Datatype Name |
|---|---|---|---|---|---|---|---|---|
| | | | | | GroupID 4630442 | | 0..1 4630444 | MaterialOut-putGroupID 4630446 |
| | | | | | Produc-tAvailabil-ityCon-firmation-Status-Code 4630448 | | 0..1 4630450 | ProductAvail-abilityConfir-mation-StatusCode 4630452 |
| | | | | | Con-firmedA-vailabili-tyDateTi me 4630454 | | 0..1 4630456 | Availability-LOCALNOR-MALISED_Da teTime 4630458 |
| | | | | | Con-firmed-Quantity 4630460 | | 0..1 4630462 | Confirmed-LARGE_Qua ntity 4630464 |

FIG. 463-19

| Package | level 1 | level 2 | level 3 | level 4 | level 5 | level 6 | Cardinality | Datatype Name |
|---|---|---|---|---|---|---|---|---|
| | | | | | Con-firmed-Quanti-tyType-Code 4630466 | | 0..1 4630468 | Confirmed-Quanti-tyTypeCode 4630470 |
| | | | | | Produc-tion-DateTime 4630472 | | 0..1 4630474 | Produc-tionLOCAL-NORMALISED_DateTime 4630476 |
| | | | | | Availabili-ty-DateTime 4630478 | | 1 4630480 | Availability-LOCALNOR-MALISED_DateTime 4630482 |
| | | | | | Planned Quantity 4630484 | | 0..1 4630486 | Planned-LARGE_Quantity 4630488 |

FIG. 463-20

| Package | | | level 1 | level 2 | level 3 | level 4 | level 5 | level 6 | Cardinality | Datatype Name |
|---|---|---|---|---|---|---|---|---|---|---|
| | | | | | | | Planned Quanti-tyType-Code 4630490 | | 0..1 4630492 | Planned-Quanti-tyTypeCode 4630494 |
| | | | | | | | Total-Quantity 4630496 | | 0..1 4630498 | Total-LARGE_Qua ntity 4630500 |
| | | | | | | | Total-Quanti-tyType-Code 4630502 | | 0..1 4630504 | TotalQuanti-tyTypeCode 4630506 |
| | | | | | | | Priority-Value 4630508 | | 0..1 4630510 | PriorityValue 4630512 |
| | | | | | | | FixedIn-dicator 4630514 | | 0..1 4630516 | FixedIndicator 4630518 |

FIG. 463-21

| Package | level 1 | level 2 | level 3 | level 4 | level 5 | level 6 | Cardinality | Datatype Name |
|---|---|---|---|---|---|---|---|---|
| | | | | | Proper-tyValua-tion 4630520 | | 0..n 4630522 | |
| | | | | | | PropertyID 4630524 | 1 4630526 | PropertyID 4630528 |
| | | | | | | Property-Value 4630530 | 1 4630532 | Property-Value 4630534 |
| | | | | | | Property-Name 4630536 | 0..1 4630538 | PropertyVal-ueME-DIUM_Name 4630540 |
| | | | | Materi-alInput 4630542 | | | 0..n 4630544 | |

FIG. 463-22

| Package | level 1 | level 2 | level 3 | level 4 | level 5 | level 6 | Cardinality | Datatype Name |
|---|---|---|---|---|---|---|---|---|
| | | | | | ItemID 4630546 | | 1 4630548 | Business-Transaction-Documen-tItemID 4630550 |
| | | | | | Product-InternalID 4630552 | | 1 4630554 | ProductInter-nalID 4630556 |
| | | | | | Supply-Plannin-gAreaID 4630558 | | 1 4630560 | SupplyPlan-ningAreaID 4630562 |
| | | | | | Material-Role-Code 4630564 | | 1 4630566 | Material-RoleCode 4630568 |

FIG. 463-23

| Package | level 1 | level 2 | level 3 | level 4 | level 5 | level 6 | Cardinality | Datatype Name |
|---|---|---|---|---|---|---|---|---|
| | | | | | Material-Supply-AndDe-mand-Type-Code 4630570 | | 1 4630572 | Materail-SupplyAnd-Demand-TypeCode 4630574 |
| | | | | | Engineer-ing-ChangeO rderID 4630576 | | 0..1 4630578 | Engineering-ChangeOrde-rID 4630580 |
| | | | | | Logistic-sArealD 4630582 | | 0..1 4630584 | Logistic-sArealD 4630586 |
| | | | | | Opera-tionID 4630588 | | 1 4630590 | OperationID 4630592 |

FIG. 463-24

| Package | level 1 | level 2 | level 3 | level 4 | level 5 | level 6 | Cardinality | Datatype Name |
|---|---|---|---|---|---|---|---|---|
| | | | | | Opera-tionActiv-ityType-Code 4630594 | | 1 4630596 | OperationAc-tivityType-Code 4630598 |
| | | | | | GroupID 4630600 | | 0..1 4630602 | MaterialIn-putGroupID 4630604 |
| | | | | | Produc-tAvailabil-ityCon-firma-tionStatu sCode 4630606 | | 0..1 4630608 | ProductAvail-abilityConfir-mation-StatusCode 4630610 |
| | | | | | Con-firmedA-vailability-DateTime 4630612 | | 0..1 4630614 | Availability-LOCALNOR-MALISED_Da teTime 4630616 |

FIG. 463-25

| Package | | | level 1 | level 2 | level 3 | level 4 | level 5 | level 6 | Cardinality | Datatype Name |
|---|---|---|---|---|---|---|---|---|---|---|
| | | | | | | | Con-firmed-Quantity 4630618 | | 0..1 4630620 | Confirmed-LARGE_Quantity 4630622 |
| | | | | | | | Con-firmed-Quanti-tyType-Code 4630624 | | 0..1 4630626 | Confirmed-Quanti-tyTypeCode 4630628 |
| | | | | | | | Issuing-Status-Code 4630630 | | 0..1 4630632 | Issuing-StatusCode 4630634 |
| | | | | | | | DueDate Time 4630636 | | 0..1 4630638 | DueLOCAL-NORMAL-ISED_DateTime 4630640 |

FIG. 463-26

| Package | level 1 | level 2 | level 3 | level 4 | level 5 | level 6 | Cardinality | Datatype Name |
|---|---|---|---|---|---|---|---|---|
| | | | | | Planned Quantity 4630642 | | 1 4630644 | Planned-LARGE_Quantity 4630646 |
| | | | | | Planned Quanti-tyType-Code 4630648 | | 0..1 4630650 | Planned-Quanti-tyTypeCode 4630652 |
| | | | | | Total-Quantity 4630654 | | 0..1 4630656 | Total-LARGE_Quantity 4630658 |
| | | | | | Total-Quanti-tyType-Code 4630660 | | 0..1 4630662 | TotalQuanti-tyTypeCode 4630664 |
| | | | | | Priority-Value 4630666 | | 0..1 4630668 | PriorityValue 4630670 |

FIG. 463-27

| Package | level 1 | level 2 | level 3 | level 4 | level 5 | level 6 | Cardinality | Datatype Name |
|---|---|---|---|---|---|---|---|---|
| | | | | | FixedIn-dicator 4630672 | | 0..1 4630674 | FixedIndicator 4630676 |
| | | | | | Proper-tyValua-tion 4630678 | | 0..n 4630680 | |
| | | | | | | PropertyID 4630682 | 1 4630684 | PropertyID 4630686 |
| | | | | | | Property-Value 4630688 | 1 4630690 | Property-Value 4630692 |
| | | | | | | Property-Value-Name 4630694 | 0..1 4630696 | PropertyVal-ueME-DIUM_Name 4630698 |
| Log 4630700 | | Log 4630702 | | | | | 1 4630704 | Log 4630706 |

FIG. 464-1

| Package | level 1 | level 2 | level 3 | level 4 | level 5 | Cardinality | Datatype Name |
|---|---|---|---|---|---|---|---|
| ProductionPlanningOrdeChangeRequestMessage_sync 464000 | ProductionPlanningOrderChangeRequestMessage_sync 464002 | | | | | | ProductionPlanningOrderChangeRequestMessage_sync 464004 |
| MessageHeader 464006 | | MessageHeader 464008 | | | | 1 464010 | BasicBusinessDocumentMessageHeader 464012 |
| ProductionPlanningOrder 464014 | | ProductionPlanningOrder 464016 | | | | 0..1 464018 | |
| | | | ID 464020 | | | 1 464022 | BusinessTransactionDocumentID 464024 |

FIG. 464-2

| Package | | | level 1 | level 2 | level 3 | level 4 | level 5 | Cardinality | Datatype Name |
|---|---|---|---|---|---|---|---|---|---|
| | | | | | Production-ModelID 464026 | | | 0..1 464028 | Production-ModelID 464030 |
| | | | | | Conversion-AllowedIndi-cator 464032 | | | 0..1 464034 | ConversionAl-lowedIndicator 464036 |
| | | Component 464038 | | | MaterialOut-put 464040 | | | 1..n 464042 | |
| | | | | | | Product-InternalID 464044 | | 1 464046 | ProductInter-nalID 464048 |
| | | | | | | Production-DateTime 464050 | | 0..1 464052 | Produc-tionLOCAL-NORMALISED_DateTime 464054 |

FIG. 464-3

| Package | | | level 1 | level 2 | level 3 | level 4 | level 5 | Cardinality | Datatype Name |
|---|---|---|---|---|---|---|---|---|---|
| | | | | | | Availability-DateTime 464056 | | 1 464058 | Availability-LOCALNORMALISED_DateTime 464060 |
| | | | | | | Planned-Quantity 464062 | | 1 464064 | LARGE_Quantity 464066 |
| | | | | | | Planned-Quanti-tyTypeCode 464068 | | 0..1 464070 | Quanti-tyTypeCode 464072 |
| | | | | | | Priority-Value 464074 | | 1 464076 | PriorityValue 464078 |
| | | | | | | FixedIndica-tor 464080 | | 1 464082 | FixedIndicator 464084 |

FIG. 464-4

| Package | | | level 1 | level 2 | level 3 | level 4 | level 5 | Cardinality | Datatype Name |
|---|---|---|---|---|---|---|---|---|---|
| | | | | | | Property-Valuation 464086 | | 0..n 464088 | |
| | | | | | | | Proper-tyID 464090 | 1 464092 | PropertyID 464094 |
| | | | | | | | Proper-tyValue 464096 | 1 464098 | PropertyValue 4640100 |
| | | | | | | | Proper-tyName 4640102 | 0..1 4640104 | PropertyVal-ueME-DIUM_Name 4640106 |
| | | | | | MaterialInput 4640108 | | | 0..n 4640110 | |
| | | | | | | ItemID 4640112 | | 1 4640114 | Business-Transaction-DocumentID 4640116 |

FIG. 464-5

| Package | | | level 1 | level 2 | level 3 | level 4 | level 5 | Cardinality | Datatype Name |
|---|---|---|---|---|---|---|---|---|---|
| | | | | | | Product-InternalID 4640118 | | 1 4640120 | ProductInter-nalID 4640122 |
| | | | | | | DueDateTi me 4640124 | | 0..1 4640126 | DueLOCAL-NORMALISED _DateTime 4640128 |
| | | | | | | Planned-Quantity 4640130 | | 1 4640132 | Planned-LARGE_Quan tity 4640134 |
| | | | | | | Planned-Quanti-tyTypeCode 4640136 | | 0..1 4640138 | PlannedQuan-tityTypeCode 4640140 |
| | | | | | | Property-Valuation 4640142 | | 0..n 4640144 | |

FIG. 464-6

| Package | | | level 1 | level 2 | level 3 | level 4 | level 5 | Cardinality | Datatype Name |
|---|---|---|---|---|---|---|---|---|---|
| | | | | | | | Proper-tyID 4640146 | 1 4640148 | PropertyID 4640150 |
| | | | | | | | Proper-tyValue 4640152 | 1 4640154 | PropertyValue 4640156 |
| | | | | | | | Proper-tyValue-Name 4640158 | 0..1 4640160 | PropertyVal-ueME-DIUM_Name 4640162 |

FIG. 465

| Package | level 1 | level 2 | level 3 | Cardinality | Datatype Name |
|---|---|---|---|---|---|
| ProductionPlanningOrder-ByIDQueryMessage_sync 465000 | ProductionPlannin-gOrderByIDQuery-Message_sync 465002 | | | | ProductionPlannin-gOrderByIDQuery-Message_sync 465004 |
| Selection 465006 | | ProductionPlan-ningOrderSelec-tionByID 465008 | | 1 465010 | |
| | | | ID 465012 | 1 465014 | BusinessTransac-tionDocumentID 465016 |

FIG. 466

| Package | level 1 | level 2 | level 3 | Cardinality | Datatype Name |
|---|---|---|---|---|---|
| ProductionPlanningOrderCancelConfirmationMessage_sync 466000 | ProductionPlanningOrderCancelConfirmationMessage_sync 466002 | | | | ProductionPlanningOrderCancelConfirmationMessage_sync 466004 |
| MessageHeader 466006 | | MessageHeader 466008 | | 1 466010 | BasicBusinessDocumentMessageHeader 466012 |
| ProductionPlanningOrder 466014 | | ProductionPlanningOrder 466016 | | 0..1 466018 | |
| | | | ID 466020 | 1 466022 | BusinessTransactionDocumentID 466024 |
| Log 466026 | | Log 466028 | | 1 466030 | Log 466032 |

FIG. 467

| Package | level 1 | level 2 | level 3 | Cardinality | Datatype Name |
|---|---|---|---|---|---|
| ProductionPlanningOrderCancelRequestMessage_sync 467000 | ProductionPlanningOrderCancelRequestMessage_sync 467002 | | | | ProductionPlanningOrderCancelRequestMessage_sync 467004 |
| MessageHeader 467006 | | MessageHeader 467008 | | 1 467010 | BasicBusinessDocumentMessageHeader 467012 |
| ProductionPlanningOrder 467014 | | ProductionPlanningOrder 467016 | | 1 467018 | |
| | | | ID 467020 | 1 467022 | BusinessTransactionDocumentID 467024 |

FIG. 468

| Package | level 1 | level 2 | level 3 | Cardinality | Datatype Name |
|---|---|---|---|---|---|
| ProductionPlanningOrder-ChangeConfirmationMes-sage_sync 468000 | ProductionPlannin-gOrderCreateCon-firmationMes-sage_sync 468002 | | | | ProductionPlannin-gOrderChangeCon-firmationMes-sage_sync 468004 |
| MessageHeader 468006 | | Message-Header 468008 | | 1 468010 | BasicBusiness-DocumentMessage-Header 468012 |
| ProductionPlannin-gOrder 468014 | | Production-Plannin-gOrder 468016 | | 0..1 468018 | |
| | | | ID 468020 | 1 468022 | BusinessTransac-tionDocumentID 468024 |
| Log 468026 | | Log 468028 | | 1 468030 | Log 468032 |

FIG. 469

| Package | level 1 | level 2 | level 3 | Cardinality | Datatype Name |
|---|---|---|---|---|---|
| ProductionPlanningOrderCreateConfirmationMessage_sync 469000 | ProductionPlanningOrderCreateConfirmationMessage_sync 469002 | | | | ProductionPlanningOrderCreateConfirmationMessage_sync 469004 |
| MessageHeader 469006 | | MessageHeader 469008 | | 1 469010 | BasicBusinessDocumentMessageHeader 469012 |
| ProductionPlanningOrder 469014 | | ProductionPlanningOrder 469016 | | 0..1 469018 | |
| | | | ID 469020 | 1 469022 | BusinessTransactionDocumentID 469024 |
| Log 469026 | | Log 469028 | | 1 469030 | Log 469032 |

FIG. 470-1

| Package | level 1 | level 2 | level 3 | level 4 | level 5 | Cardinality | Datatype Name |
|---|---|---|---|---|---|---|---|
| ProductionPlanningOrderCreateRequestMessage_sync 470000 | ProductionPlanningOrderCreateRequestMessage_sync 470002 | | | | | | ProductionPlanningOrderCreateRequestMessage_sync 470004 |
| MessageHeader 470006 | | MessageHeader 470008 | | | | 1 470010 | BasicBusinessDocumentMessageHeader 470012 |
| ProductionPlanningOrder 470014 | | ProductionPlanningOrder 470016 | | | | 1 470018 | |
| | | | ID 470020 | | | 0..1 470022 | BusinessTransactionDocumentID 470024 |
| | | | PlanningVersionID 470026 | | | 1 470028 | PlanningVersionID 470030 |

FIG. 470-2

| Package | | | level 1 | level 2 | level 3 | level 4 | level 5 | Cardinality | Datatype Name |
|---|---|---|---|---|---|---|---|---|---|
| | | | | | SupplyPlanningAreaID 470032 | | | 1 470034 | SupplyPlanningAreaID 470036 |
| | | | | | LogisticsPlanningDetailLevelCode 470038 | | | 0..1 470040 | LogisticsPlanningDetailLevelCode 470042 |
| | | Component 470044 | | | MaterialOutput 470046 | | | 1..n 470048 | |
| | | | | | | ProductInternalID 470050 | | 1 470052 | ProductInternalID 470054 |

FIG. 470-3

| Package | | | level 1 | level 2 | level 3 | level 4 | level 5 | Cardinality | Datatype Name |
|---|---|---|---|---|---|---|---|---|---|
| | | | | | | SupplyPlan-ningA-realD 470056 | | 1 470058 | SupplyPlan-ningAreaID 470060 |
| | | | | | | Produc tion-DateTi me 470062 | | 0..1 470064 | Produc-tionLOCAL-NORMALISED _DateTime 470066 |
| | | | | | | Avail-ability-DateTi me 470068 | | 1 470070 | Availability-LOCALNORM ALISED_Date Time 470072 |
| | | | | | | Planne dQuant ity 470074 | | 1 470076 | LARGE_Quan tity 470078 |

FIG. 470-4

| Package | | | level 1 | level 2 | level 3 | level 4 | level 5 | Cardinality | Datatype Name |
|---|---|---|---|---|---|---|---|---|---|
| | | | | | | PlannedQuantityTypeCode 470080 | | 0..1 470082 | Quanti-tyTypeCode 470084 |
| | | | | | | Prop-erty-Valua-tion 470086 | | 0..n 470088 | |
| | | | | | | | PropertyID 470090 | 1 470092 | PropertyID 470094 |
| | | | | | | | Property-Value 470096 | 1 470098 | PropertyValue 4700100 |
| | | | | | | | Property-Name 4700102 | 0..1 4700104 | PropertyVal-ueME-DIUM_Name 4700106 |

FIG. 471-1

| Package | | level 1 | level 2 | level 3 | level 4 | Cardinality | Datatype Name |
|---|---|---|---|---|---|---|---|
| ProductionPlanningOrderSimple-ByElementsQueryMessage_sync 471000 | | ProductionPlan-ningOrderSim-pleByElement-sQueryMes-sage_sync 471002 | | | | | ProductionPlan-ningOrderSim-pleByElement-sQueryMes-sage_sync 471004 |
| | Selection 471006 | | Produduc tionPlan-ningOr-derSelec-tionSim-pleByE-lements 471008 | | | 1 471010 | |
| | | | | Planning-VersionID 471012 | | 1 471014 | PlanningVer-sionID 471016 |
| | | | | Selection-ByProduc-tionPlan-ningOrder-TypeCode | | 1 471020 | |

FIG. 471-2

| | | | | | | | |
|---|---|---|---|---|---|---|---|
| | | | | 471018 | | | |
| | | | | | Inclusion-Exclusion-Code 471022 | 1 471024 | InclusionExclusionCode 471026 |
| | | | | | Interval-Bound-aryType-Code 471028 | 1 471030 | IntervalBound-aryTypeCode 471032 |
| | | | | | Lower-Bound-aryProduc-tionPlannin-gOrder-TypeCode 471034 | 1 471036 | BusinessTransac-tionDocument-TypeCode 471038 |
| | | | | | Upper-Bound-aryProduc-tionPlannin-gOrder-TypeCode 471040 | 0..1 471042 | BusinessTransac-tionDocument-TypeCode 471044 |

FIG. 471-3

| | | | | | | | |
|---|---|---|---|---|---|---|---|
| | | | | Selection-BySupply-PlanningA-realD 471046 | | 0..1 471048 | |
| | | | | | Inclusion-Exclusion-Code 471050 | 1 471052 | InclusionExclu-sionCode 471054 |
| | | | | | Interval-Bound-aryType-Code 471056 | 1 471058 | IntervalBound-aryTypeCode 471060 |
| | | | | | Lower-Boundary-Supply-PlanningA-realD 471062 | 1 471064 | SupplyPlanningA-realD 471066 |
| | | | | | Upper-Boundary-Supply-PlanningA-realD 471068 | 0..1 471070 | SupplyPlanningA-realD 471072 |

FIG. 471-4

| | | | | | | | |
|---|---|---|---|---|---|---|---|
| | | | | Selection-ByProduct-InternalID 471074 | | 0..1 471076 | |
| | | | | | Inclusion-Exclusion-Code 471078 | 1 471080 | InclusionExclu-sionCode 471082 |
| | | | | | Interval-Bound-aryType-Code 471084 | 1 471086 | IntervalBound-aryTypeCode 471088 |
| | | | | | Lower-Bound-aryProduct-InternalID 471090 | 1 471092 | ProductInternalID 471094 |
| | | | | | Upper-Bound-aryProduct-lInternalID 471096 | 0..1 471098 | ProductInternalID 4710100 |
| | | | | Selection-ByResour-ceID | | 0..1 4710104 | |

FIG. 471-5

| | | | | | | | |
|---|---|---|---|---|---|---|---|
| | | | | 4710102 | | | |
| | | | | | Inclusion-Exclusion-Code 4710106 | 1 4710108 | InclusionExclusionCode 4710110 |
| | | | | | Interval-Bound-aryType-Code 4710112 | 1 4710114 | IntervalBound-aryTypeCode 4710116 |
| | | | | | Lower-Bound-aryResour-ceID 4710118 | 1 4710120 | ResourceID 4710122 |
| | | | | | Upper-Bound-aryResour-ceID 4710124 | 0..1 4710126 | ResourceID 4710128 |
| | | | | Selection-ByAvail-ability-DateTime 4710130 | | 0..1 4710132 | |

FIG. 471-6

| | | | | | | | |
|---|---|---|---|---|---|---|---|
| | | | | | Inclusion-Exclusion-Code 4710134 | 1 4710136 | InclusionExclusionCode 4710138 |
| | | | | | Interval-Boundary-Type-Code 4710140 | 1 4710142 | IntervalBoundaryTypeCode 4710144 |
| | | | | | Lower-BoundaryAvailabilityDateTime 4710146 | 1 4710148 | AvailabilityLOCALNORMALISED_DateTime 4710150 |
| | | | | | Upper-BoundaryAvailbilityDateTime 4710152 | 1 4710154 | AvailabilityLOCALNORMALISED_DateTime 4710156 |

FIG. 472

| Package | level 1 | level 2 | level 3 | Cardinality | Datatype Name |
|---|---|---|---|---|---|
| ProductionPlanningOrderSimpleByElementsResponseMessage_sync 472000 | ProductionPlanningOrderSimpleByElementsResponseMessage_sync 472002 | | | | ProductionPlanningOrderSimpleByElementsResponseMessage_sync 472004 |
| Message-Header 472006 | | MessageHeader 472008 | | 1 472010 | BasicBusinessDocumentMessageHeader 472012 |
| Production-PlanningOrder 472014 | | ProductionPlanningOrder 472016 | | 0..n 472018 | |
| | | | ID 472020 | 1 472022 | BusinessTransactionDocumentID 472024 |
| Log 472026 | | Log 472028 | | 1 472030 | Log 472032 |

FIG. 484-1

| Package | level 1 | level 2 | level 3 | level 4 | level 5 | Cardinality | Datatype Name |
|---|---|---|---|---|---|---|---|
| ProductionProposalByElementsQueryMessage_sync 484000 | ProductionProposalByElementsQueryMessage_sync 484002 | | | | | | ProductionProposalByElementsQueryMessage_sync 484004 |
| MessageHeader 484006 | | MessageHeader 484008 | | | | 1..1 484010 | BusinessDocumentMessageHeader 484012 |
| | | | ID 484014 | | | 1..1 484016 | BusinessDocumentMessageID 484018 |
| | | | ReferenceID 484020 | | | 0..1 484022 | BusinessDocumentMessageID 484024 |
| | | | CreationDateTime 484026 | | | 1..1 484028 | GLOBAL_DateTime 484030 |

FIG. 484-2

| Package | | level 1 | level 2 | level 3 | level 4 | level 5 | Cardinality | Datatype Name |
|---|---|---|---|---|---|---|---|---|
| | | | | Test-DataIndica-tor 484032 | | | 0..1 484034 | Indicator 484036 |
| | | | | Reconcilia-tionIndica-tor 484038 | | | 0..1 484040 | Indicator 484042 |
| | | | | Sender-Party 484044 | | | 0..1 484046 | Business-DocumentMes-sageHeader-Party 484048 |
| | | | | | InternalID 484050 | | 0..1 484052 | PartyInternalID 484054 |
| | | | | | StandardID 484056 | | 0..n 484058 | PartyStan-dardID 484060 |

FIG. 484-3

| Package | | level 1 | level 2 | level 3 | level 4 | level 5 | Cardinality | Datatype Name |
|---|---|---|---|---|---|---|---|---|
| | | | | | Contact-Person 484062 | | 0..1 484064 | Business-DocumentMessageHeader-PartyContact-Person 484066 |
| | | | | Recipient-Party 484068 | | | 0..n 484070 | Business-DocumentMessageHeader-Party 484072 |
| | | | | | InternalID 484074 | | 0..1 484076 | PartyInternalID 484078 |
| | | | | | StandardID 484080 | | 0..n 484082 | PartyStan-dardID 484084 |

FIG. 484-4

| Package | level 1 | level 2 | level 3 | level 4 | level 5 | Cardinality | Datatype Name |
|---|---|---|---|---|---|---|---|
| | | | | Contact-Person 484086 | | 0..1 484088 | Business-DocumentMes-sageHeader-PartyContact-Person 484090 |
| | | | Busi-nessScope Busi-nessProc-ess 484092 | | | 0..n 484094 | BusinessS-copeBusi-nessProcess 484096 |
| | | | | TypeCode 484098 | | 1..1 4840100 | BusinessS-copeBusi-nessProc-essTypeCode 4840102 |
| | | | | InstanceID 4840104 | | 0..1 4840106 | BusinessS-copeBusi-nessProc-essInstanceID 4840108 |

FIG. 484-5

| Package | | level 1 | level 2 | level 3 | level 4 | level 5 | Cardinality | Datatype Name |
|---|---|---|---|---|---|---|---|---|
| | | | | | ID 4840110 | | 0..1 4840112 | BusinessScopeBusinessProcessID 4840114 |
| | Selection 4840116 | | ProductionProposalSelectionByElements 4840118 | | | | 1..1 4840120 | |
| | | | | PlanningVersionID 4840122 | | | 1..1 4840124 | PlanningVersionID 4840126 |
| | | | | SelectionByLocationInternalID 4840128 | | | 0..n 4840130 | |
| | | | | | InclusionExclusionCode 4840132 | | 0..1 4840134 | InclusionExclusionCode 4840136 |

FIG. 484-6

| Package | | level 1 | level 2 | level 3 | level 4 | level 5 | Cardinality | Datatype Name |
|---|---|---|---|---|---|---|---|---|
| | | | | | Interval-Bound-aryType-Code 4840138 | | 1..1 4840140 | IntervalBound-aryTypeCode 4840142 |
| | | | | | Lower-Boundary-LocationIn-ternalID 4840144 | | 0..1 4840146 | LocationInter-nalID 4840148 |
| | | | | | Upper-Boundary-LocationIn-ternalID 4840150 | | 0..1 4840152 | LocationInter-nalID 4840154 |
| | | | | Selection-ByProduct-InternalID 4840156 | | | 0..n 4840158 | |

FIG. 484-7

| Package | | level 1 | level 2 | level 3 | level 4 | level 5 | Cardinality | Datatype Name |
|---|---|---|---|---|---|---|---|---|
| | | | | | Inclusion-Exclusion-Code 4840160 | | 0..1 4840162 | InclusionExclusionCode 4840164 |
| | | | | | Interval-Bound-aryType-Code 4840166 | | 1..1 4840168 | IntervalBound-aryTypeCode 4840170 |
| | | | | | Lower-Bound-aryPro-ductInter-nalID 4840172 | | 0..1 4840174 | ProductInter-nalID 4840176 |
| | | | | | Upper-Bound-aryPro-ductInter-nalID 4840178 | | 0..1 4840180 | ProductInter-nalID 4840182 |

FIG. 484-8

| Package | | level 1 | level 2 | level 3 | level 4 | level 5 | Cardinality | Datatype Name |
|---|---|---|---|---|---|---|---|---|
| | | | | Selection-BySour-ceOfSup-plyRefer-ence 4840184 | | | 0..n 4840186 | |
| | | | | | Inclusion-Exclusion-Code 4840188 | | 0..1 4840190 | InclusionExclu-sionCode 4840192 |
| | | | | | Interval-Bound-aryType-Code 4840194 | | 1..1 4840196 | IntervalBound-aryTypeCode 4840198 |
| | | | | | Lower-Boundary-SourceOf-Sup-plyRefer-ence 4840200 | | 0..1 4840202 | SourceOfSup-plyReference 4840204 |

FIG. 484-9

| Package | | level 1 | level 2 | level 3 | level 4 | level 5 | Cardinality | Datatype Name |
|---|---|---|---|---|---|---|---|---|
| | | | | | | SourceOf-SupplyUUID 4840206 | 0..1 4840208 | UUID 4840210 |
| | | | | | | SourceOf-SupplyLo-gisticRela-tion-shipUUID 4840212 | 0..1 4840214 | UUID 4840216 |
| | | | | | Upper-Boundary-SourceOf-Sup-plyRefer-ence 4840218 | | 0..1 4840220 | SourceOfSup-plyReference 4840222 |
| | | | | | | SourceOf-SupplyUUID 4840224 | 0..1 4840226 | UUID 4840228 |

FIG. 484-10

| Package | | level 1 | level 2 | level 3 | level 4 | level 5 | Cardinality | Datatype Name |
|---|---|---|---|---|---|---|---|---|
| | | | | | | SourceOf-SupplyLo-gisticRela-tion-shipUUID 4840230 | 0..1 4840232 | UUID 4840234 |
| | | | | DateTimeP eriod 4840236 | | | 1..1 4840238 | UPPEROPEN_GLOBAL_Date TimePeriod 4840240 |
| | | | | | Start-DateTime 4840242 | | 0..1 4840244 | DateTime 4840246 |
| | | | | | End-DateTime 4840248 | | 0..1 4840250 | DateTime 4840252 |
| | | | | FixedIndi-cator 4840254 | | | 0..1 4840256 | Indicator 4840258 |

FIG. 484-11

| Package | | level 1 | level 2 | level 3 | level 4 | level 5 | Cardinality | Datatype Name |
|---|---|---|---|---|---|---|---|---|
| | | | | Maximum-Number-Value 4840260 | | | 0..1 4840262 | NumberValue 4840264 |

FIG. 485-1

| Package | level 1 | level 2 | level 3 | level 4 | level 5 | Cardinality | Datatype Name |
|---|---|---|---|---|---|---|---|
| ProductionProposal-ByElementsRespon-seMessage_sync 485000 | Production-ProposalByE-lementsRe-sponseMes-sage_sync 485002 | | | | | | Production-ProposalByE-lementsRe-sponseMes-sage_sync 485004 |
| MessageHeader 485006 | | Message-Header 485008 | | | | 1..1 485010 | BasicBusi-nessDocu-mentMes-sageHeader 485012 |
| | | | ID 485014 | | | 0..1 485016 | Business-Document-MessageID 485018 |
| | | | UUID 485020 | | | 0..1 485022 | ATTRIBUTEI NDEPENDEN T_UUID 485024 |

FIG. 485-2

| Package | level 1 | level 2 | level 3 | level 4 | level 5 | Cardinality | Datatype Name |
|---|---|---|---|---|---|---|---|
| | | | ReferenceID 485026 | | | 0..1 485028 | Business-Document-MessageID 485030 |
| | | | Refer-enceUUID 485032 | | | 0..1 485034 | ATTRIBUTEINDEPENDENT_UUID 485036 |
| ProductionPro-posal 485038 | | Production-Proposal 485040 | | | | 0..n 485042 | |
| | | | ID 485044 | | | 1..1 485046 | Production-ProposalID 485048 |
| | | | PlanningVer-sionID 485050 | | | 1..1 485052 | PlanningVer-sionID 485054 |
| | | | LocationInter-nalID 485056 | | | 1..1 485058 | LocationInter-nalID 485060 |

FIG. 485-3

| Package | | level 1 | level 2 | level 3 | level 4 | level 5 | Cardinality | Datatype Name |
|---|---|---|---|---|---|---|---|---|
| | | | | ProductInter-nalID 485062 | | | 1..1 485064 | ProductInter-nalID 485066 |
| | | | | Quantity 485068 | | | 1..1 485070 | Quantity 485072 |
| | | | | Availability-DateTime 485074 | | | 1..1 485076 | GLOBAL_DateTime 485078 |
| | | | | SourceOfSup-plyReference 485080 | | | 1..1 485082 | SourceOf-SupplyRefer-ence 485084 |
| | | | | | SourceOf-SupplyUUID 485086 | | 0..1 485088 | UUID 485090 |

FIG. 485-4

| Package | level 1 | level 2 | level 3 | level 4 | level 5 | Cardinality | Datatype Name |
|---|---|---|---|---|---|---|---|
| | | | | SourceOfSupplyLogisticRelationshipUUID 485092 | | 0..1 485094 | UUID 485096 |
| | | | FixedIndicator 485098 | | | 1..1 4850100 | Indicator 4850102 |
| Activity 4850104 | | | Activity 4850106 | | | 1..n 4850108 | ... |
| | | | | UUID 4850110 | | 1..1 4850112 | UUID 4850114 |
| | | | | OperationActivityCategoryCode 4850116 | | 1..1 4850118 | OperationActivityCategoryCode 4850120 |

FIG. 485-5

| Package | level 1 | level 2 | level 3 | level 4 | level 5 | Cardinality | Datatype Name |
|---|---|---|---|---|---|---|---|
| | | | | Opera-tionAcitivty-Category-Name 4850122 | | 1..1 4850124 | LANGUAGEINDEPENDENT_MEDIUM_Name 4850126 |
| | | | | DateTimePeriod 4850128 | | 1..1 4850130 | UPPEROPEN_GLOBAL_DateTimePeriod 4850132 |
| | | | | | Start-DateTime 4850134 | 0..1 4850136 | DateTime 4850138 |
| | | | | | End-DateTime 4850140 | 0..1 4850142 | DateTime 4850144 |
| Product 4850146 | | | | OutputMate-rial 4850148 | | 0..n 4850150 | ... |

FIG. 485-6

| Package | | | | level 1 | level 2 | level 3 | level 4 | level 5 | Cardinality | Datatype Name |
|---|---|---|---|---|---|---|---|---|---|---|
| | | | | | | | | Product-InternalID 4850152 | 1..1 4850154 | ProductInter-nalID 4850156 |
| | | | | | | | | Availabili-tyDateTime 4850158 | 1..1 4850160 | GLOBAL_Dat eTime 4850162 |
| | | | | | | | | Quantity 4850164 | 1..1 4850166 | Quantity 4850168 |
| | | | | | | | InputMate-rial 4850170 | | 0..n 4850172 | ... |
| | | | | | | | | Product-InternalID 4850174 | 1 4850176 | ProductInter-nalID 4850178 |
| | | | | | | | | Require-ment-DateTime 4850180 | 1 4850182 | GLOBAL_Dat eTime 4850184 |

FIG. 485-7

| Package | level 1 | level 2 | level 3 | level 4 | level 5 | Cardinality | Datatype Name |
|---|---|---|---|---|---|---|---|
| | | | | | Quantity 4850186 | 1 4850188 | Quantity 4850190 |
| Capac-ityRe-quirement 4850192 | | | | CapacityRe-quirement 4850194 | | 0..n 4850196 | ... |
| | | | | | ResourceID 4850198 | 1..1 4850200 | ResourceID 4850202 |
| | | | | | Quantity 4850204 | 1..1 4850206 | Quantity 4850208 |
| Log 4850210 | | Log 4850212 | | | | 1..1 4850214 | Log 4850216 |
| | | | Business-Document-ProcessingRe-sultCode 4850218 | | | 0..1 4850220 | Processin-gResultCode 4850222 |

FIG. 485-8

| Package | level 1 | level 2 | level 3 | level 4 | level 5 | Cardinality | Datatype Name |
|---|---|---|---|---|---|---|---|
| | | | Maximum-LogItemSeverityCode 4850224 | | | 0..1 4850226 | LogItem-SeverityCode 4850228 |
| | | | Item 4850230 | | | 0..n 4850232 | LogItem 4850234 |

FIG. 486-1

| Package | level 1 | level 2 | level 3 | level 4 | level 5 | Cardinality | Datatype Name |
|---|---|---|---|---|---|---|---|
| ProductionProposalBy-IDQueryMessage_sync 486000 | Production-ProposalBy-IDQuery-Mes-sage_sync 486002 | | | | | | ProductionPro-posalByIDQuery-Message_sync 486004 |
| MessageHeader 486006 | | Message-Header 486008 | | | | 1..1 486010 | BusinessDocu-mentMessage-Header 486012 |
| | | | ID 486014 | | | 1..1 486016 | BusinessDocu-mentMessageID 486018 |
| | | | Referen-ceID 486020 | | | 0..1 486022 | BusinessDocu-mentMessageID 486024 |
| | | | Creation-DateTime 486026 | | | 1..1 486028 | GLOBAL_DateTime 486030 |

FIG. 486-2

| Package | | level 1 | level 2 | level 3 | level 4 | level 5 | Cardinality | Datatype Name |
|---|---|---|---|---|---|---|---|---|
| | | | | Test-DataIndicator 486032 | | | 0..1 486034 | Indicator 486036 |
| | | | | ReconciliationIndicator 486038 | | | 0..1 486040 | Indicator 486042 |
| | | | | Sender-Party 486044 | | | 0..1 486046 | BusinessDocumentMessage-HeaderParty 486048 |
| | | | | | InternalID 486050 | | 0..1 486052 | PartyInternalID 486054 |
| | | | | | StandardID 486056 | | 0..n 486058 | PartyStandardID 486060 |

FIG. 486-3

| Package | level 1 | level 2 | level 3 | level 4 | level 5 | Cardinality | Datatype Name |
|---|---|---|---|---|---|---|---|
| | | | | Contact-Person 486062 | | 0..1 486064 | BusinessDocumentMessageHeaderPartyContactPerson 486066 |
| | | | Recipient-Party 486068 | | | 0..n 486070 | BusinessDocumentMessageHeaderParty 486072 |
| | | | | InternalID 486074 | | 0..1 486076 | PartyInternalID 486078 |
| | | | | StandardID 486080 | | 0..n 486082 | PartyStandardID 486084 |
| | | | | Contact-Person 486086 | | 0..1 486088 | BusinessDocumentMessageHeaderPartyContactPerson 486090 |

FIG. 486-4

| Package | | level 1 | level 2 | level 3 | level 4 | level 5 | Cardinality | Datatype Name |
|---|---|---|---|---|---|---|---|---|
| | | | | BusinessScopeBusinessProcess 486092 | | | 0..n 486094 | BusinessScope-BusinessProcess 486096 |
| | | | | | TypeCode 486098 | | 1..1 4860100 | BusinessScope-BusinessProcessTypeCode 4860102 |
| | | | | | InstanceID 4860104 | | 0..1 4860106 | BusinessScope-BusinessProcessInstanceID 4860108 |
| | | | | | ID 4860110 | | 0..1 4860112 | BusinessScope-BusinessProcessID 4860114 |
| | Selection 4860116 | | Production-ProposalSelectionByID 4860118 | | | | 1..1 4860120 | |

FIG. 486-5

| Package | | level 1 | level 2 | level 3 | level 4 | level 5 | Cardinality | Datatype Name |
|---|---|---|---|---|---|---|---|---|
| | | | | ProductionProposalID 4860122 | | | 1..1 4860124 | ProductionProposalID 4860126 |

FIG. 487-1

| Package | level 1 | level 2 | level 3 | level 4 | level 5 | Cardinality | Datatype Name |
|---|---|---|---|---|---|---|---|
| ProductionProposalBy-IDResponseMes-sage_sync 487000 | ProductionPro-posalByIDRespon-seMessage_sync 487002 | | | | | | Produc-tionPro-posalBy-IDRespon-seMes-sage_sync 487004 |
| MessageHeader 487006 | | Message-Header 487008 | | | | 1..1 487010 | BasicBusi-nessDocu-mentMes-sage-Header 487012 |
| | | | ID 487014 | | | 0..1 487016 | Business-Docu-mentMes-sageID 487018 |

FIG. 487-2

| Package | level 1 | level 2 | level 3 | level 4 | level 5 | Cardinality | Datatype Name |
|---|---|---|---|---|---|---|---|
| | | | UUID 487020 | | | 0..1 487022 | ATTRIBUTEINDEPENDENT_UUID 487024 |
| | | | ReferenceID 487026 | | | 0..1 487028 | BusinessDocumentMessageID 487030 |
| | | | ReferenceUUID 487032 | | | 0..1 487034 | ATTRIBUTEINDEPENDENT_UUID 487036 |
| ProductionProposal 487038 | | ProductionProposal 487040 | | | | 0..1 487042 | |

FIG. 487-3

| Package | level 1 | level 2 | level 3 | level 4 | level 5 | Cardinality | Datatype Name |
|---|---|---|---|---|---|---|---|
| | | | ID 487044 | | | 1..1 487046 | ProductionProposalID 487048 |
| | | | PlanningVersionID 487050 | | | 1..1 487052 | PlanningVersionID 487054 |
| | | | LocationInternalID 487056 | | | 1..1 487058 | LocationInternalID 487060 |
| | | | ProductInternalID 487062 | | | 1..1 487064 | ProductInternalID 487066 |
| | | | Quantity 487068 | | | 1..1 487070 | Quantity 487072 |
| | | | AvailabilityDateTime 487074 | | | 1..1 487076 | GLOBAL_DateTime 487078 |

FIG. 487-4

| Package | level 1 | level 2 | level 3 | level 4 | level 5 | Cardinality | Datatype Name |
|---|---|---|---|---|---|---|---|
| | | | SourceOfSupplyReference 487080 | | | 1..1 487082 | SourceOfSupplyReference 487084 |
| | | | | SourceOfSupplyUUID 487086 | | 0..1 487088 | UUID 487090 |
| | | | | SourceOfSupplyLogisticRelationshipUUID 487092 | | 0..1 487094 | UUID 487096 |
| | | | FixedIndicator 487098 | | | 1..1 4870100 | Indicator 4870102 |
| Activity 4870104 | | | Activity 4870106 | | | 1..N 4870108 | ... |

FIG. 487-5

| Package | | | level 1 | level 2 | level 3 | level 4 | level 5 | Cardinality | Datatype Name |
|---|---|---|---|---|---|---|---|---|---|
| | | | | | | UUID 4870110 | | 1..1 4870112 | UUID 4870114 |
| | | | | | | Opera-tionActiv-ityCate-goryCode 4870116 | | 1..1 4870118 | Opera-tionActiv-ityCate-goryCode 4870120 |
| | | | | | | Opera-tionAcitiv-tyCate-goryName 4870122 | | 1..1 4870124 | LANGUAGEINDEPENDENT_MEDIUM_Name 4870126 |
| | | | | | | DateTime Period 4870128 | | 1..1 4870130 | UPPEROPEN_GLOBAL_DateTimePeriod 4870132 |
| | | | | | | | Start-DateTime 4870134 | 0..1 4870136 | DateTime 4870138 |

FIG. 487-6

| Package | level 1 | level 2 | level 3 | level 4 | level 5 | Cardinality | Datatype Name |
|---|---|---|---|---|---|---|---|
| | | | | | End-DateTime 4870140 | 0..1 4870142 | DateTime 4870144 |
| Product 4870146 | | | | OutputMaterial 4870148 | | 0..n 4870150 | ... |
| | | | | | Product-InternalID 4870152 | 1..1 4870154 | Product-InternalID 4870156 |
| | | | | | Availability-DateTime 4870158 | 1..1 4870160 | GLOBAL_DateTime 4870162 |
| | | | | | Quantity 4870164 | 1..1 4870166 | Quantity 4870168 |
| | | | | InputMaterial 4870170 | | 0..n 4870172 | ... |

FIG. 487-7

| Package | level 1 | level 2 | level 3 | level 4 | level 5 | Cardinality | Datatype Name |
|---|---|---|---|---|---|---|---|
| | | | | | Product-InternalID 4870174 | 1..1 4870176 | Product-InternalID 4870178 |
| | | | | | Require-ment-DateTime 4870180 | 1..1 4870182 | GLOBAL_ DateTime 4870184 |
| | | | | | Quantity 4870186 | 1..1 4870188 | Quantity 4870190 |
| CapacityRe-quirement 4870192 | | | | Capac-ityRe-quirement 4870194 | | 0..n 4870196 | ... |
| | | | | | ResourceID 4870198 | 1..1 4870200 | Resour-ceID 4870202 |
| | | | | | Quantity 4870204 | 1..1 4870206 | Quantity 4870208 |

FIG. 487-8

| Package | level 1 | level 2 | level 3 | level 4 | level 5 | Cardinality | Datatype Name |
|---|---|---|---|---|---|---|---|
| Log 4870210 | | Log 4870212 | | | | 1..1 4870214 | Log 4870216 |
| | | | Business-Document-Processin-gResult-Code 4870218 | | | 0..1 4870220 | Processin-gResult-Code 4870222 |
| | | | Maximum-LogItem-Severity-Code 4870224 | | | 0..1 4870226 | LogItem-Severity-Code 4870228 |
| | | | Item 4870230 | | | 0..n 4870232 | LogItem 4870234 |

FIG. 488-1

| Package | level 1 | level 2 | level 3 | level 4 | Cardinality | Datatype Name |
|---|---|---|---|---|---|---|
| ProductionProposalCancelConfirmationMessage_sync 488000 | ProductionProposal-CancelConfirmation-Message_sync 488002 | | | | | Production-Proposal-CancelCon-firmation-Mes-sage_sync 488004 |
| MessageHeader 488006 | | MessageHeader 488008 | | | 1..1 488010 | BasicBusi-nessDocu-mentMes-sageHeader 488012 |
| | | | ID 488014 | | 0..1 488016 | Business-Document-MessageID 488018 |
| | | | UUID 488020 | | 0..1 488022 | ATTRIBUTEINDEPENDENT_UUID 488024 |

FIG. 488-2

| Package | | level 1 | level 2 | level 3 | level 4 | Cardinality | Datatype Name |
|---|---|---|---|---|---|---|---|
| | | | | ReferenceID 488026 | | 0..1 488028 | Business-Document-MessageID 488030 |
| | | | | Refer-enceUUID 488032 | | 0..1 488034 | ATTRIBUTEINDEPENDENT_UUID 488036 |
| | ProductionPro-posal 488038 | | ProductionPro-posal 488040 | | | 0..1 488042 | |
| | | | | ID 488044 | | 1..1 488046 | Production-ProposalID 488048 |
| | | | | PlanningVer-sionID 488050 | | 1..1 488052 | Planning-VersionID 488054 |
| | | | | LocationInter-nalID 488056 | | 1..1 488058 | LocationIn-ternalID 488060 |

FIG. 488-3

| Package | | level 1 | level 2 | level 3 | level 4 | Cardinality | Datatype Name |
|---|---|---|---|---|---|---|---|
| | | | | ProductInter-nalID 488062 | | 1..1 488064 | Product-InternalID 488066 |
| | | | | Quantity 488068 | | 1..1 488070 | Quantity 488072 |
| | | | | Availability-DateTime 488074 | | 1..1 488076 | GLOBAL_DateTime 488078 |
| | | | | SourceOf-SupplyRefer-ence 488080 | | 1..1 488082 | SourceOf-SupplyReference 488084 |
| | | | | | SourceOf-SupplyUUID 488086 | 0..1 488088 | UUID 488090 |
| | | | | | SourceOf-SupplyLogis-ticRelation-shipUUID 488092 | 0..1 488094 | UUID 488096 |

FIG. 488-4

| Package | level 1 | level 2 | level 3 | level 4 | Cardinality | Datatype Name |
|---|---|---|---|---|---|---|
| | | | FixedIndicator 488098 | | 1..1 4880100 | Indicator 4880102 |
| Log 4880104 | | Log 4880106 | | | 1..1 4880108 | Log 4880110 |
| | | | Business-Document-Processin-gResultCode 4880112 | | 0..1 4880114 | Processin-gResult-Code 4880116 |
| | | | Maximum-LogItem-SeverityCode 4880118 | | 0..1 4880120 | LogItem-Severity-Code 4880122 |
| | | | Item 4880124 | | 0..n 4880126 | LogItem 4880128 |

FIG. 489-1

| Package | level 1 | level 2 | level 3 | level 4 | Cardinality | Datatype Name |
|---|---|---|---|---|---|---|
| ProductionProposalCancelRequestMessage_sync 489000 | ProductionProposalCancelRequestMessage_sync 489002 | | | | | ProductionProposalCancelRequestMessage_sync 489004 |
| MessageHeader 489006 | | MessageHeader 489008 | | | 1 489010 | BusinessDocumentMessageHeader 489012 |
| | | | ID 489014 | | 1..1 489016 | BusinessDocumentMessageID 489018 |
| | | | ReferenceID 489020 | | 0..1 489022 | BusinessDocumentMessageID 489024 |
| | | | CreationDateTime 489026 | | 1..1 489028 | GLOBAL_DateTime 489030 |

FIG. 489-2

| Package | | level 1 | level 2 | level 3 | level 4 | Cardinality | Datatype Name |
|---|---|---|---|---|---|---|---|
| | | | | TestDataIn-dicator 489032 | | 0..1 489034 | Indicator 489036 |
| | | | | Reconcilia-tionIndicator 489038 | | 0..1 489040 | Indicator 489042 |
| | | | | Sender-Party 489044 | | 0..1 489046 | BusinessDocumentMes-sageHeaderParty 489048 |
| | | | | | InternalID 489050 | 0..1 489052 | PartyInternalID 489054 |
| | | | | | StandardID 489056 | 0..n 489058 | PartyStandardID 489060 |
| | | | | | ContactPer-son 489062 | 0..1 489064 | BusinessDocumentMes-sageHeaderPartyCon-tactPerson 489066 |

FIG. 489-3

| Package | | level 1 | level 2 | level 3 | level 4 | Cardinality | Datatype Name |
|---|---|---|---|---|---|---|---|
| | | | | Recipient-Party 489068 | | 0..n 489070 | BusinessDocumentMessageHeaderParty 489072 |
| | | | | | InternalID 489074 | 0..1 489076 | PartyInternalID 489078 |
| | | | | | StandardID 489080 | 0..n 489082 | PartyStandardID 489084 |
| | | | | | ContactPerson 489086 | 0..1 489088 | BusinessDocumentMessageHeaderPartyContactPerson 489090 |
| | | | | BusinessScopeBusinessProcess 489092 | | 0..n 489094 | BusinessScopeBusinessProcess 489096 |

FIG. 489-4

| Package | level 1 | level 2 | level 3 | level 4 | Cardinality | Datatype Name |
|---|---|---|---|---|---|---|
| | | | | TypeCode 489098 | 1..1 4890100 | BusinessScopeBusinessProcessTypeCode 4890102 |
| | | | | InstanceID 4890104 | 0..1 4890106 | BusinessScopeBusinessProcessInstanceID 4890108 |
| | | | | ID 4890110 | 0..1 4890112 | BusinessScopeBusinessProcessID 4890114 |
| Production-Proposal 4890116 | | ProductionProposal 4890118 | | | 1..1 4890120 | |
| | | | ID 4890122 | | 1..1 4890124 | ProductionProposalID 4890126 |

FIG. 490-1

| Package | level 1 | level 2 | level 3 | level 4 | Cardinality | Datatype Name |
|---|---|---|---|---|---|---|
| ProductionProposal-ChangeConfirmationMessage_sync 490000 | ProductionProposalChange-Confirmation-Message_sync 490002 | | | | | ProductionProposalChange-Confirmation-Message_sync 490004 |
| MessageHeader 490006 | | Message-Header 490008 | | | 1..1 490010 | BasicBusiness-DocumentMessageHeader 490012 |
| | | | ID 490014 | | 0..1 490016 | BusinessDocumentMessageID 490018 |
| | | | UUID 490020 | | 0..1 490022 | ATTRIBUTEINDEPENDENT_UUID 490024 |
| | | | ReferenceID 490026 | | 0..1 490028 | BusinessDocumentMessageID 490030 |

FIG. 490-2

| Package | | level 1 | level 2 | level 3 | level 4 | Cardinality | Datatype Name |
|---|---|---|---|---|---|---|---|
| | | | | ReferenceUUID 490032 | | 0..1 490034 | ATTRIBUTEINDEPENDENT_UUID 490036 |
| | ProductionProposal 490038 | | Production-Proposal 490040 | | | 0..1 490042 | |
| | | | | ID 490044 | | 1..1 490046 | ProductionProposalID 490048 |
| | | | | PlanningVersionID 490050 | | 1..1 490052 | PlanningVersionID 490054 |
| | | | | LocationInternalID 490056 | | 1..1 490058 | LocationInternalID 490060 |
| | | | | ProductInternalID 490062 | | 1..1 490064 | ProductInternalID 490066 |

FIG. 490-3

| Package | | level 1 | level 2 | level 3 | level 4 | Cardinality | Datatype Name |
|---|---|---|---|---|---|---|---|
| | | | | Quantity 490068 | | 1..1 490070 | Quantity 490072 |
| | | | | Availability-DateTime 490074 | | 1..1 490076 | GLOBAL_DateTime 490078 |
| | | | | SourceOfSup-plyReference 490080 | | 1..1 490082 | SourceOfSup-plyReference 490084 |
| | | | | | SourceOfSup-plyUUID 490086 | 0..1 490088 | UUID 490090 |
| | | | | | SourceOfSup-plyLogisticRe-lation-shipUUID 490092 | 0..1 490094 | UUID 490096 |
| | | | | FixedIndicator 490098 | | 1..1 4900100 | Indicator 4900102 |

FIG. 490-4

| Package | level 1 | level 2 | level 3 | level 4 | Cardinality | Datatype Name |
|---|---|---|---|---|---|---|
| Log 4900104 | | Log 4900106 | | | 1..1 4900108 | Log 4900110 |
| | | | BusinessDocumentProcessingResultCode 4900112 | | 0..1 4900114 | ProcessingResultCode 4900116 |
| | | | MaximumLogItemSeverityCode 4900118 | | 0..1 4900120 | LogItemSeverityCode 4900122 |
| | | | Item 4900124 | | 0..n 4900126 | LogItem 4900128 |

FIG. 491-1

| Package | level 1 | level 2 | level 3 | level 4 | Cardinality | Datatype Name |
|---|---|---|---|---|---|---|
| ProductionProposal-ChangeRequestMessage_sync 491000 | ProductionProposal-ChangeRequestMessage_sync 491002 | | | | | ProductionProposal-ChangeRequestMessage_sync 491004 |
| MessageHeader 491006 | | MessageHeader 491008 | | | 1..1 491010 | BusinessDocument-MessageHeader 491012 |
| | | | ID 491014 | | 1..1 491016 | BusinessDocument-MessageID 491018 |
| | | | ReferenceID 491020 | | 0..1 491022 | BusinessDocument-MessageID 491024 |
| | | | CreationDateTime 491026 | | 1..1 491028 | GLOBAL_DateTime 491030 |

FIG. 491-2

| Package | level 1 | level 2 | level 3 | level 4 | Cardinality | Datatype Name |
|---|---|---|---|---|---|---|
| | | | TestDataIndicator 491032 | | 0..1 491034 | Indicator 491036 |
| | | | ReconciliationIndicator 491038 | | 0..1 491040 | Indicator 491042 |
| | | | SenderParty 491044 | | 0..1 491046 | BusinessDocumentMessageHeaderParty 491048 |
| | | | | InternalID 491050 | 0..1 491052 | PartyInternalID 491054 |
| | | | | StandardID 491056 | 0..n 491058 | PartyStandardID 491060 |
| | | | | ContactPerson 491062 | 0..1 491064 | BusinessDocumentMessageHeaderPartyContactPerson 491066 |

FIG. 491-3

| Package | | level 1 | level 2 | level 3 | level 4 | Cardinality | Datatype Name |
|---|---|---|---|---|---|---|---|
| | | | | Recipient-Party 491068 | | 0..n 491070 | BusinessDocument-MessageHeaderParty 491072 |
| | | | | | InternalID 491074 | 0..1 491076 | PartyInternalID 491078 |
| | | | | | StandardID 491080 | 0..n 491082 | PartyStandardID 491084 |
| | | | | | ContactPerson 491086 | 0..1 491088 | BusinessDocument-MessageHeaderPar-tyContactPerson 491090 |
| | | | | BusinessS-copeBusi-nessProcess 491092 | | 0..n 491094 | BusinessScopeBusi-nessProcess 491096 |
| | | | | | TypeCode 491098 | 1..1 4910100 | BusinessScopeBusi-nessProcessType-Code 4910102 |

FIG. 491-4

| Package | | level 1 | level 2 | level 3 | level 4 | Cardinality | Datatype Name |
|---|---|---|---|---|---|---|---|
| | | | | | InstanceID 4910104 | 0..1 4910106 | BusinessScopeBusinessProcessInstanceID 4910108 |
| | | | | | ID 4910110 | 0..1 4910112 | BusinessScopeBusinessProcessID 4910114 |
| | ProductionProposal 4910116 | | Production-Proposal 4910118 | | | 1..1 4910120 | |
| | | | | ID 4910122 | | 1..1 4910124 | ProductionProposalID 4910126 |
| | | | | Quantity 4910128 | | 0..1 4910130 | Quantity 4910132 |
| | | | | Availability-DateTime 4910134 | | 0..1 4910136 | GLOBAL_DateTime 4910138 |

FIG. 491-5

| Package | level 1 | level 2 | level 3 | level 4 | Cardinality | Datatype Name |
|---|---|---|---|---|---|---|
| | | | SourceOf-SupplyRefer-ence 4910140 | | 0..1 4910142 | SourceOfSup-plyReference 4910144 |
| | | | | SourceOfSup-plyUUID 4910146 | 0..1 4910148 | UUID 4910150 |
| | | | | SourceOfSup-plyLogisticRe-lation-shipUUID 4910152 | 0..1 4910154 | UUID 4910156 |
| | | | FixedIndicator 4910158 | | 0..1 4910160 | Indicator 4910162 |

FIG. 492-1

| Package | level 1 | level 2 | level 3 | level 4 | Cardinality | Datatype Name |
|---|---|---|---|---|---|---|
| ProductionProposalCreateConfirmationMessage_sync 492000 | ProductionProposalCreate-Confirmation-Message_sync 492002 | | | | | ProductionProposalCreateConfirmationMessage_sync 492004 |
| MessageHeader 492006 | | Message-Header 492008 | | | 1..1 492010 | BasicBusinessDocumentMessageHeader 492012 |
| | | | ID 492014 | | 0..1 492016 | BusinessDocumentMessageID 492018 |
| | | | UUID 492020 | | 0..1 492022 | ATTRIBUTEINDEPENDENT_UUID 492024 |
| | | | ReferenceID 492026 | | 0..1 492028 | BusinessDocumentMessageID 492030 |

FIG. 492-2

| Package | | level 1 | level 2 | level 3 | level 4 | Cardinality | Datatype Name |
|---|---|---|---|---|---|---|---|
| | | | | Refer-enceUUID 492032 | | 0..1 492034 | ATTRIBUTEINDEPENDENT_UUID 492036 |
| | ProductionProposal 492038 | | Production-Proposal 492040 | | | 0..1 492042 | |
| | | | | ID 492044 | | 1..1 492046 | ProductionPro-posalID 492048 |
| | | | | PlanningVer-sionID 492050 | | 1..1 492052 | PlanningVersionID 492054 |
| | | | | LocationInter-nalID 492056 | | 1..1 492058 | LocationInternalID 492060 |
| | | | | ProductInter-nalID 492062 | | 1..1 492064 | ProductInternalID 492066 |

FIG. 492-3

| Package | | level 1 | level 2 | level 3 | level 4 | Cardinality | Datatype Name |
|---|---|---|---|---|---|---|---|
| | | | | Quantity 492068 | | 1..1 492070 | Quantity 492072 |
| | | | | Availability-DateTime 492074 | | 1..1 492076 | GLOBAL_DateTime 492078 |
| | | | | SourceOfSup-plyReference 492080 | | 1..1 492082 | SourceOfSup-plyReference 492084 |
| | | | | | SourceOf-SupplyUUID 492086 | 0..1 492088 | UUID 492090 |
| | | | | | SourceOf-SupplyLogis-ticRelation-shipUUID 492092 | 0..1 492094 | UUID 492096 |
| | | | | FixedIndicator 492098 | | 1..1 4920100 | Indicator 4920102 |

FIG. 492-4

| Package | level 1 | level 2 | level 3 | level 4 | Cardinality | Datatype Name |
|---|---|---|---|---|---|---|
| Log 4920104 | | Log 4920106 | | | 1..1 4920108 | Log 4920110 |
| | | | Business-Document-Processin-gResultCode 4920112 | | 0..1 4920114 | ProcessingResult-Code 4920116 |
| | | | Maximum-LogItemSever-ityCode 4920118 | | 0..1 4920120 | LogItemSeverity-Code 4920122 |
| | | | Item 4920124 | | 0..n 4920126 | LogItem 4920128 |

FIG. 493-1

| Package | level 1 | level 2 | level 3 | level 4 | Cardinality | Datatype Name |
|---|---|---|---|---|---|---|
| ProductionProposalCreateRequestMessage_sync 493000 | ProductionProposalCreateRequestMessage_sync 493002 | | | | | ProductionProposalCreateRequestMessage_sync 493004 |
| MessageHeader 493006 | | MessageHeader 493008 | | | 1..1 493010 | BusinessDocumentMessageHeader 493012 |
| | | | ID 493014 | | 1..1 493016 | BusinessDocumentMessageID 493018 |
| | | | ReferenceID 493020 | | 0..1 493022 | BusinessDocumentMessageID 493024 |
| | | | CreationDateTime 493026 | | 1..1 493028 | GLOBAL_DateTime 493030 |

FIG. 493-2

| Package | | level 1 | level 2 | level 3 | level 4 | Cardinality | Datatype Name |
|---|---|---|---|---|---|---|---|
| | | | | TestDataIndi-cator 493032 | | 0..1 493034 | Indicator 493036 |
| | | | | Reconciliation-Indicator 493038 | | 0..1 493040 | Indicator 493042 |
| | | | | SenderParty 493044 | | 0..1 493046 | BusinessDocu-mentMessage-HeaderParty 493048 |
| | | | | | InternalID 493050 | 0..1 493052 | PartyInternalID 493054 |
| | | | | | StandardID 493056 | 0..n 493058 | PartyStandardID 493060 |
| | | | | | ContactPerson 493062 | 0..1 493064 | BusinessDocu-mentMessage-HeaderPartyCon-tactPerson 493066 |

FIG. 493-3

| Package | | level 1 | level 2 | level 3 | level 4 | Cardinality | Datatype Name |
|---|---|---|---|---|---|---|---|
| | | | | RecipientParty 493068 | | 0..n 493070 | BusinessDocumentMessage-HeaderParty 493072 |
| | | | | | InternalID 493074 | 0..1 493076 | PartyInternalID 493078 |
| | | | | | StandardID 493080 | 0..n 493082 | PartyStandardID 493084 |
| | | | | | ContactPerson 493086 | 0..1 493088 | BusinessDocumentMessage-HeaderPartyContactPerson 493090 |
| | | | | BusinessScopeBusinessProcess 493092 | | 0..n 493094 | BusinessScope-BusinessProcess 493096 |

FIG. 493-4

| Package | level 1 | level 2 | level 3 | level 4 | Cardinality | Datatype Name |
|---|---|---|---|---|---|---|
| | | | | TypeCode 493098 | 1..1 4930100 | BusinessScope-BusinessProc-essTypeCode 4930102 |
| | | | | InstanceID 4930104 | 0..1 4930106 | BusinessScope-BusinessProc-essInstanceID 4930108 |
| | | | | ID 4930110 | 0..1 4930112 | BusinessScope-BusinessProces-sID 4930114 |
| ProductionProposal 4930116 | | Production-Proposal 4930118 | | | 1..1 4930120 | |
| | | | PlanningVer-sionID 4930122 | | 1..1 4930124 | PlanningVer-sionID 4930126 |

FIG. 493-5

| Package | | level 1 | level 2 | level 3 | level 4 | Cardinality | Datatype Name |
|---|---|---|---|---|---|---|---|
| | | | | LocationInter-nalID 4930128 | | 1..1 4930130 | LocationInter-nalID 4930132 |
| | | | | ProductInter-nalID 4930134 | | 1..1 4930136 | ProductInternalID 4930138 |
| | | | | Quantity 4930140 | | 1..1 4930142 | Quantity 4930144 |
| | | | | Availability-DateTime 4930146 | | 1..1 4930148 | GLOBAL_DateTi me 4930150 |
| | | | | SourceOfSup-plyReference 4930152 | | 1..1 4930154 | SourceOfSup-plyReference 4930156 |
| | | | | | SourceOfSup-plyUUID 4930158 | 0..1 4930160 | UUID 4930162 |

FIG. 493-6

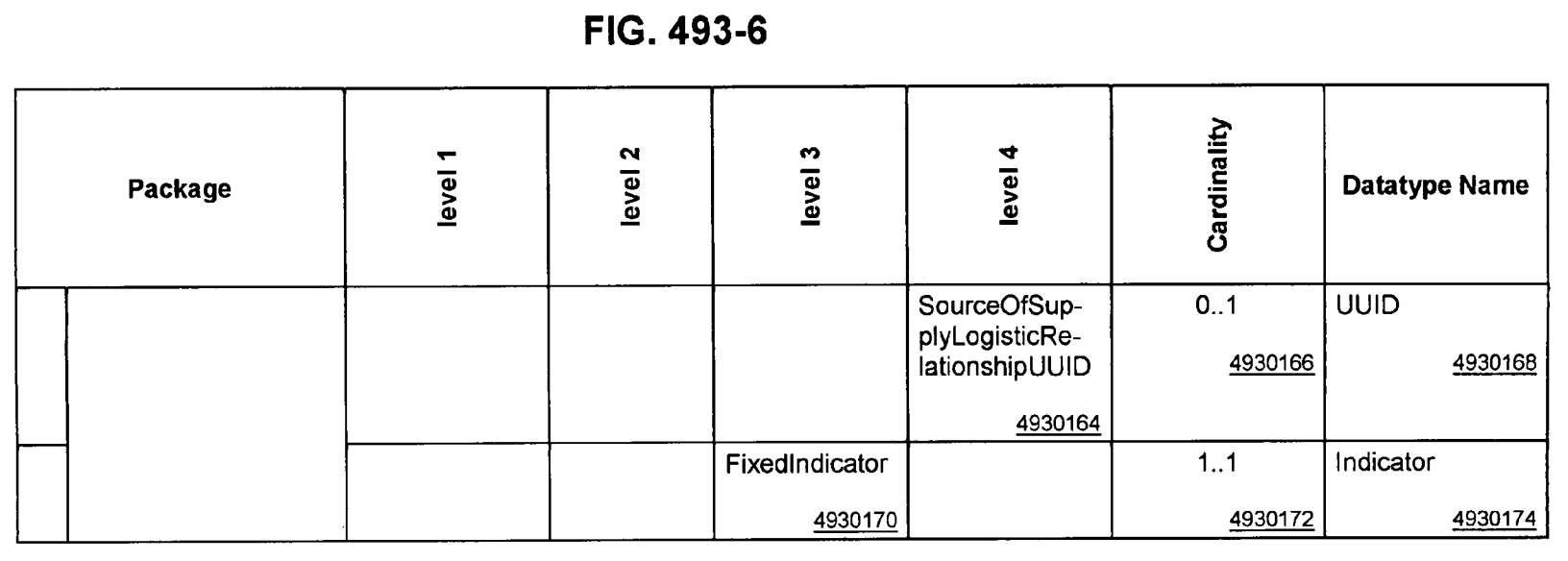

| Package | level 1 | level 2 | level 3 | level 4 | Cardinality | Datatype Name |
|---|---|---|---|---|---|---|
| | | | | SourceOfSupplyLogisticRelationshipUUID 4930164 | 0..1 4930166 | UUID 4930168 |
| | | | FixedIndicator 4930170 | | 1..1 4930172 | Indicator 4930174 |

FIG. 517

| Package | level 1 | level 2 | level 3 | Cardinality | Datatype Name |
|---|---|---|---|---|---|
| ProjectActivityAttachmentByActivityIDAndNetworkIDQueryMessage 517000 | ProjectActivityAttachment-ByActivityIDAndNet-workIDQueryMessage 517002 | | | | ProjectActivityAttachment ByActivityI-DAndNetworkIDQueryMessage 517004 |
| Selection 517006 | | ProjectActivityAttachmentSelectionByActivityIDAndNetworkID 517008 | | 1 517010 | |
| | | | Project ActivityID 517012 | 1 517014 | ProjectActivityID 517016 |
| | | | Project NetworkID 517018 | 1 517020 | ProjectNetworkID 517022 |

FIG. 518-1

| Package | level 1 | level 2 | level 4 | level 5 | level 6 | Cardinality | Datatype Name |
|---|---|---|---|---|---|---|---|
| ProjectActivity AttachmentBy ActivityID AndNetwork IDResponse 518000 | ProjectActivity AttachmentBy ActivityIDAnd NetworkID Response Message 518002 | | | | | | ProjectActivityAttach-mentByActivityIDAnd-NetworkID Response-Message 518004 |
| Project 518006 | | Project 518008 | | | | 0..1 518010 | |
| | | | ID 518012 | | | 1 518014 | ProjectID 518016 |
| | | | Activity 518018 | | | 0..1 518020 | |
| | | | | ID 518022 | | 1 518024 | ProjectActivityID 518026 |
| | | | | NetworkID 518028 | | 1 518030 | ProjectNetworkID 518032 |
| | | | | Attachment 518034 | | 0..n 518036 | |

FIG. 518-2

| Package | level 1 | level 2 | level 4 | level 5 | level 6 | Cardinality | Datatype Name |
|---|---|---|---|---|---|---|---|
| | | | | | Name 518038 | 1 518040 | LANGUAGEINDEPENDENT_ EXTENDED_Name 518042 |
| | | | | | Alternative-DocumentID 518044 | 1 518046 | AlternativeDocumentID 518048 |
| | | | | | TypeCode 518050 | 1 518052 | DocumentTypeCode 518054 |
| | | | | | VersionID 518056 | 1 518058 | VersionID 518060 |
| Log 518062 | | Log 518064 | | | | 1 518066 | Log 518068 |

FIG. 519

| Package | level 1 | level 2 | level 3 | Cardinality | Datatype Name |
|---|---|---|---|---|---|
| ProjectActivityByActivityID QueryMessage 519000 | ProjectActivityByActivityIDQuery Message 519002 | | | | ProjectActivityBy ActivityID QueryMessage 519004 |
| MessageHeader 519006 | | Message Header 519008 | | 0..1 519010 | BasicBusinessDocument MessageHeader 519012 |
| Selection 519014 | | ProjectActivity SelectionBy ActivityID 519016 | | 1 519018 | |
| | | | Project ActivityID 519020 | 1 519022 | ProjectActivityID 519024 |
| | | | Project NetworkID 519026 | 1 519028 | ProjectNetworkID 519030 |

FIG. 520-1

| Package | level 1 | level 2 | level 3 | level 4 | level 5 | Cardinality | Datatype Name |
|---|---|---|---|---|---|---|---|
| ProjectActivityBy Activity IDRe-sponse 520000 | ProjectActivityBy ActivityIDResponse Message 520002 | | | | | | ProjectActivity ByActivity IDResponse Message 520004 |
| Message Header 520006 | | Message Header 520008 | | | | 0..1 520010 | BasicBusiness Document Mes-sageHeader 520012 |
| Project 520014 | | Project 520016 | | | | 0..1 520018 | |
| Task 520020 | | | Task 520022 | | | 1 520024 | |
| Activity 520026 | | | | Activity 520028 | | 0..1 520030 | |
| | | | | | ID 520032 | 1 520034 | ProjectActivityID 520036 |
| | | | | | NetworkID 520038 | 1 520040 | Project Net-workID 520042 |

FIG. 520-2

| Package | level 1 | level 2 | level 3 | level 4 | level 5 | Cardinality | Datatype Name |
|---|---|---|---|---|---|---|---|
| | | | | | TypeCode 520044 | 1 520046 | ProjectActivity Control Profile-Code 520048 |
| | | | | | EarliestPlanned Period 520050 | 0..1 520052 | UPPEROPEN_ GLOBAL_Date TimePeriod 520054 |
| | | | | | LatestPlanned Period 520056 | 0..1 520058 | UPPEROPEN_ GLOBAL_Date Time Period 520060 |
| | | | | | ProductPrice 520062 | 0..1 520064 | Price 520066 |
| | | | | | PlannedCost 520068 | 0..1 520070 | Amount 520072 |
| | | | | | Duration 520074 | 0..1 520076 | Duration 520078 |
| | | | | | Description 520080 | 0..1 520082 | SHORT_ De-scription 520084 |

FIG. 520-3

| Package | level 1 | level 2 | level 3 | level 4 | level 5 | Cardinality | Datatype Name |
|---|---|---|---|---|---|---|---|
| Log 520086 | | Log 520088 | | | | 1 520090 | Log 520092 |

FIG. 521

| Package | level 1 | level 2 | level 3 | Cardinality | Datatype Name |
|---|---|---|---|---|---|
| ProjectActivityBy WorkBreakdown Structure Ele-mentID Query-Message 521000 | ProjectActivityByWork BreakdownStructure ElementIDQueryMessage 521002 | | | | ProjectActivity ByWork Breakdown Structure Ele-ment Query-Message 521004 |
| Message Header 521006 | | MessageHeader 521008 | | 0..1 521010 | BasicBusiness Document Message-Header 521012 |
| Selection 521014 | | ProjectActivity Selection By-Work Break-down Structure ElementID 521016 | | 1 521018 | |
| | | | ProjectWorkBreakdown StructureElementID 521020 | 1 521022 | ProjectWork Breakdown StructureEle-mentID 521024 |

FIG. 522-1

| Package | level 1 | level 2 | level 3 | level 4 | level 5 | Cardinality | Datatype Name |
|---|---|---|---|---|---|---|---|
| ProjectActivityByWork Breakdown Structure ElementID Response 522000 | ProjectActivityBy Work Break-down Structure ElementID Re-sponseMessage 522002 | | | | | | ProjectActivity ByWork Breakdown Structure ElementID Response-Message 522004 |
| Message Header 522006 | | Message Header 522008 | | | | 0..1 522010 | BasicBusiness Document MessageHeader 522012 |
| Project 522014 | | Project 522016 | | | | 0..1 522018 | |
| Task 522020 | | | Task 522022 | | | 1 522024 | |
| Activity 522026 | | | | Activity 522028 | | 0..n 522030 | |
| | | | | | ID 522032 | 1 522034 | ProjectActivityID 522036 |
| | | | | | NetworkID 522038 | 1 522040 | ProjectNetworkID 522042 |

FIG. 522-2

| Package | level 1 | level 2 | level 3 | level 4 | level 5 | Cardinality | Datatype Name |
|---|---|---|---|---|---|---|---|
| | | | | | TypeCode 522044 | 1 522046 | ProjectActivityControl ProfileCode 522048 |
| | | | | | Earliest Planned Period 522050 | 0..1 522052 | UPPEROPEN_ GLOBAL_DateTimePeriod 522054 |
| | | | | | Latest Planned Period 522056 | 0..1 522058 | UPPEROPEN_ GLOBAL_ DateTimePeriod 522060 |
| | | | | | Product Price 522062 | 0..1 522064 | Price 522066 |
| | | | | | PlannedCost 522068 | 0..1 522070 | Amount 522072 |
| | | | | | Duration 522074 | 0..1 522076 | Duration 522078 |
| | | | | | Description 522080 | 0..1 522082 | SHORT_Description 522084 |

FIG. 522-3

| Package | level 1 | level 2 | level 3 | level 4 | level 5 | Cardinality | Datatype Name |
|---|---|---|---|---|---|---|---|
| Log 522086 | | Log 522088 | | | | 1 522090 | Log 522092 |

FIG. 523-1

| Package | level 1 | level 2 | level 3 | level 4 | level 5 | Cardinality | Datatype Name |
|---|---|---|---|---|---|---|---|
| ProjectActivity ChangeCheck Query 523000 | ProjectActivityChangeCheckQueryMessage 523002 | | | | | | ProjectActivity ChangeCheck QueryMessage 523004 |
| Message Header 523006 | | MessageHeader 523008 | | | | 0..1 523010 | BasicBusiness DocumentMessageHeader 523012 |
| Project 523014 | | Project 523016 | | | | 1 523018 | |
| Task 523020 | | | Task 523022 | | | 1 523024 | |
| Activity 523026 | | | | Activity 523028 | | 1 523030 | |
| | | | | | ID 523032 | 1 523034 | ProjectActivityID 523036 |
| | | | | | NetworkID 523038 | 1 523040 | ProjectNetworkID 523042 |

FIG. 523-2

| Package | level 1 | level 2 | level 3 | level 4 | level 5 | Cardinality | Datatype Name |
|---|---|---|---|---|---|---|---|
| | | | | | TypeCode 523044 | 1 523046 | ProjectActivity Control Profile-Code 523048 |
| | | | | | Earliest Planned Pe-riod 523050 | 0..1 523052 | UPPEROPEN_ GLOBAL _DateTimePeriod 523054 |
| | | | | | Latest PlannedPeriod 523056 | 0..1 523058 | UPPEROPEN_ GLOBAL_ DateTimePeriod 523060 |
| | | | | | Product Price 523062 | 0..1 523064 | Price 523066 |
| | | | | | Planned Cost 523068 | 0..1 523070 | Amount 523072 |
| | | | | | Duration 523074 | 0..1 523076 | Duration 523078 |
| | | | | | Description 523080 | 0..1 523082 | SHORT_ De-scription 523084 |

FIG. 524

| Package | level 1 | level 2 | Cardinality | Datatype Name |
|---|---|---|---|---|
| ProjectActivityChangeCheckResponse 524000 | ProjectActivityChangeCheckResponseMessage 524002 | | | ProjectActivityChangeCheckResponseMessage 524004 |
| MessageHeader 524006 | | MessageHeader 524008 | 0..1 524010 | BasicBusinessDocumentMessageHeader 524012 |
| Log 524014 | | Log 524016 | 1 524018 | Log 524020 |

FIG. 525

| Package | level 1 | level 2 | Cardinality | Datatype Name |
|---|---|---|---|---|
| ProjectActivity ChangeConfirmation 525000 | ProjectActivityChange ConfirmationMessage 525002 | | | ProjectActivityChange ConfirmationMessage 525004 |
| MessageHeader 525006 | | Message Header 525008 | 0..1 525010 | BasicBusinessDocument MessageHeader 525012 |
| Log 525014 | | Log 525016 | 1 525018 | Log 525020 |

FIG. 526-1

| Package | level 1 | level 2 | level 3 | level 4 | level 5 | Cardinality | Datatype Name |
|---|---|---|---|---|---|---|---|
| ProjectActivity ChangeRequest 526000 | ProjectActivity ChangeRequest Message 526002 | | | | | | ProjectActivity ChangeRequest Message 526004 |
| Message Header 526006 | | MessageHeader 526008 | | | | 0..1 526010 | BasicBusiness Document MessageHeader 526012 |
| Project 526014 | | Project 526016 | | | | 1 526018 | |
| Task 526020 | | | Task 526022 | | | 1 526024 | |
| Activity 526026 | | | | Activity 526028 | | 1 526030 | |
| | | | | | ID 526032 | 1 526034 | Project ActivityID 526036 |
| | | | | | NetworkID 526038 | 1 526040 | Project NetworkID 526042 |
| | | | | | TypeCode 526044 | 1 526046 | ProjectActivity ControlProfileCode 526048 |

FIG. 526-2

| Package | level 1 | level 2 | level 3 | level 4 | level 5 | Cardinality | Datatype Name |
|---|---|---|---|---|---|---|---|
| | | | | | Earliest Planned Period 526050 | 0..1 526052 | UPPEROPEN _GLOBAL_ Date TimePeriod 526054 |
| | | | | | Latest Planned Period 526056 | 0..1 526058 | UPPEROPEN_GLOBAL_D ateTimePeriod 526060 |
| | | | | | Product Price 526062 | 0..1 526064 | Price 526066 |
| | | | | | Planned Cost 526068 | 0..1 526070 | Amount 526072 |
| | | | | | Duration 526074 | 0..1 526076 | Duration 526078 |
| | | | | | Description 526080 | 0..1 526082 | SHORT_ Description 526084 |

FIG. 527

| Package | level 1 | level 2 | level 3 | Cardinality | Datatype Name |
|---|---|---|---|---|---|
| ProjectByPartyQuery Message 527000 | ProjectByParty QueryMessage 527002 | | | | ProjectByParty QueryMessage 527004 |
| Selection 527006 | | ProjectSelection ByParty 527008 | | 1 527010 | |
| | | | PartyID 527012 | 1 527014 | PartyID 527016 |
| | | | PartyRoleCode 527018 | 1 527020 | PartyRoleCode 527022 |

FIG. 528

| Package | level 1 | level 2 | level 3 | Cardinality | Datatype Name |
|---|---|---|---|---|---|
| ProjectByParty ResponseMessage 528000 | ProjectByParty ResponseMessage 528002 | | | | ProjectByParty ResponseMessage 528004 |
| Project 528006 | | Project 528008 | | 0..n 528010 | |
| | | | ID 528012 | 1 528014 | ProjectID 528016 |
| | | | Description 528018 | 0..1 528020 | SHORT_Description 528022 |
| Log 528024 | | Log 528026 | | 1 528028 | Log 528030 |

FIG. 529

| Package | level 1 | level 2 | level 3 | Cardinality | Datatype Name |
|---|---|---|---|---|---|
| ProjectDescriptionByIDQuery Message 529000 | ProjectDescription ByIDQuery Message 529002 | | | | Project DescriptionByID Query-Message 529004 |
| Selection 529006 | | ProjectDescriptionSelectionByID 529008 | | 1 529010 | |
| | | | ProjectID 529012 | 1 529014 | ProjectID 529016 |

FIG. 530

| Package | level 1 | level 2 | level 3 | Cardinality | Datatype Name |
|---|---|---|---|---|---|
| ProjectDescription ByIDResponse 530000 | Project De-scriptionBy IDResponse Message 530002 | | | | ProjectDescription ByIDResponse Message 530004 |
| Project 530006 | | Project 530008 | | 0..n 530010 | |
| | | | ID 530012 | 1 530014 | ProjectID 530016 |
| | | | Description 530018 | 0..1 530020 | SHORT_Description 530022 |
| Log 530024 | | Log 530026 | | 1 530028 | Log 530030 |

FIG. 531-1

| Package | level 1 | level 2 | level 3 | level 4 | level 5 | Cardinality | Datatype Name |
|---|---|---|---|---|---|---|---|
| ProjectMessage 531000 | Project Message 531002 | | | | | | ProjectMessage 531004 |
| MessageHeader 531006 | | Message Header 531008 | | | | 0..1 531010 | BasicBusiness Document Mes-sageHeader 531012 |
| Project 531014 | | Project 531016 | | | | 0..n 531018 | |
| | | | ID 531020 | | | 1 531022 | ProjectID 531024 |
| | | | Description 531026 | | | 0..1 531028 | SHORT_Description 531030 |
| Task 531032 | | | Task 531034 | | | 1 531036 | |

FIG. 531-2

| Package | level 1 | level 2 | level 3 | level 4 | level 5 | Cardinality | Datatype Name |
|---|---|---|---|---|---|---|---|
| Work Breakdown Structure Element 531038 | | | | WorkBreakdown Structure Element 531040 | | 0..n 531042 | |
| | | | | | ID 531044 | 1 531046 | ProjectWork Breakdown StructureElementID 531048 |
| | | | | | Description 531050 | 0..1 531052 | SHORT_Description 531054 |
| Network 531056 | | | | Network 531058 | | 0..n 531060 | |
| | | | | | ID 531062 | 1 531064 | ProjectNetworkID 531066 |
| | | | | | Description | 0..1 | SHORT_Description |

FIG. 531-3

| Package | level 1 | level 2 | level 3 | level 4 | level 5 | Cardinality | Datatype Name |
|---|---|---|---|---|---|---|---|
| | | | | | 531068 | 531070 | 531072 |
| Activity 531074 | | | | Activity 531076 | | 0..n 531078 | |
| | | | | | ID 531080 | 1 531082 | ProjectActivityID 531084 |
| | | | | | NetworkID 531086 | 1 531088 | ProjectNetworkID 531090 |
| | | | | | TypeCode 531092 | 1 531094 | ProjectActivityControlProfileCode 531096 |

FIG. 531-4

| Package | level 1 | level 2 | level 3 | level 4 | level 5 | Cardinality | Datatype Name |
|---|---|---|---|---|---|---|---|
| | | | | | Earliest Planned Period 531098 | 0..1 5310100 | UPPEROPEN_ GLOBAL_ DateTimePeriod 5310102 |
| | | | | | Latest Planned Period 5310104 | 0..1 5310106 | UPPEROPEN_ GLOBAL_Date TimePeriod 5310108 |
| | | | | | Product Price 5310110 | 0..1 5310112 | Price 5310114 |
| | | | | | Planned Cost 5310116 | 0..1 5310118 | Amount 5310120 |

FIG. 531-5

| Package | level 1 | level 2 | level 3 | level 4 | level 5 | Cardinality | Datatype Name |
|---|---|---|---|---|---|---|---|
| | | | | | Duration 5310122 | 0..1 5310124 | Duration 5310126 |
| | | | | | Description 5310128 | 0..1 5310130 | SHORT_Description 5310132 |
| Log 5310134 | | Log 5310136 | | | | 0..1 5310138 | Log 5310140 |

FIG. 532

| Package | level 1 | level 2 | level 3 | Cardinality | Datatype Name |
|---|---|---|---|---|---|
| ProjectPartyByIDAndRoleCodeQueryMessage 532000 | ProjectPartyByIDAndRoleCodeQueryMessage 532002 | | | | ProjectPartyByIDAndRoleCodeQueryMessage 532004 |
| Selection 532006 | | ProjectPartySelectionByIDAndPartyRoleCode 532008 | | 1 532010 | |
| | | | ID 532012 | 1 532014 | ProjectID 532016 |
| | | | PartyRoleCode 532018 | 1 532020 | PartyRoleCode 532022 |

FIG. 533-1

| Package | level 1 | level 2 | level 3 | level 4 | level 5 | Cardinality | Datatype Name |
|---|---|---|---|---|---|---|---|
| ProjectPartyByIDAndRoleCode Response 533000 | ProjectPartyByIDAnd RoleCode Respon-seMessage 533002 | | | | | | ProjectPartyByIDAnd RoleCode Response Message 533004 |
| Project 533006 | | Project 533008 | | | | 0..1 533010 | |
| | | | ID 533012 | | | 1 533014 | ProjectID 533016 |
| | | | Party 533018 | | | 0..n 533020 | |
| | | | | Customer Party 533022 | | 0..n 533024 | |
| | | | | | ID 533026 | 1 533028 | PartyID 533030 |
| | | | | | RoleCode 533032 | 1 533034 | PartyRoleCode 533036 |
| | | | | | Name 533038 | 0..1 533040 | MEDIUM_Name 533042 |
| | | | | VendorParty 533044 | | 0..n 533046 | |

FIG. 533-2

| Package | level 1 | level 2 | level 3 | level 4 | level 5 | Cardinality | Datatype Name |
|---|---|---|---|---|---|---|---|
| | | | | | ID 533048 | 1 533050 | PartyID 533052 |
| | | | | | RoleCode 533054 | 1 533056 | PartyRoleCode 533058 |
| | | | | | Name 533060 | 0..1 533062 | MEDIUM_Name 533064 |
| | | | | Responsible Employee Party 533066 | | 0..n 533068 | |
| | | | | | ID 533070 | 1 533072 | PartyID 533074 |
| | | | | | RoleCode 533076 | 1 533078 | PartyRoleCode 533080 |
| | | | | | Name 533082 | 0..1 533084 | MEDIUM_Name 533086 |
| | | | | Responsible Organizational UnitParty 533088 | | 0..n 533090 | |

FIG. 533-3

| Package | level 1 | level 2 | level 3 | level 4 | level 5 | Cardinality | Datatype Name |
|---|---|---|---|---|---|---|---|
| | | | | | ID 533092 | 1 533094 | PartyID 533096 |
| | | | | | RoleCode 533098 | 1 5330100 | PartyRoleCode 5330102 |
| | | | | | Name 5330104 | 0..1 5330106 | MEDIUM_Name 5330108 |
| | | | | ContactParty 5330110 | | 0..n 5330112 | |
| | | | | | ID 5330114 | 1 5330116 | PartyID 5330118 |
| | | | | | RoleCode 5330120 | 1 5330122 | PartyRoleCode 5330124 |
| | | | | | Name 5330126 | 0..1 5330128 | MEDIUM_Name 5330130 |
| | | | | | Project Manager Party 5330132 | 0..n 5330134 | |
| | | | | | | 1 5330136 | PartyID 5330138 |

FIG. 533-4

| Package | level 1 | level 2 | level 3 | level 4 | level 5 | Cardinality | Datatype Name |
|---|---|---|---|---|---|---|---|
| | | | | | | 0..1 5330140 | PartyFormatted Name 5330142 |
| | | | | | Project Controller Party 5330144 | 0..n 5330146 | |
| | | | | | | 1 5330148 | PartyID 5330150 |
| | | | | | | 0..1 5330152 | PartyFormatted Name 5330154 |
| | | | | | Project Scheduler Party 5330156 | 0..n 5330158 | |
| | | | | | | 1 5330160 | PartyID 5330162 |
| | | | | | | 0..1 5330164 | PartyFormatted Name 5330166 |

FIG. 533-5

| Package | level 1 | level 2 | level 3 | level 4 | level 5 | Cardinality | Datatype Name |
|---|---|---|---|---|---|---|---|
| | | | | | ProjectIssue ManagerParty 5330168 | 0..n 5330170 | |
| | | | | | | 1 5330172 | PartyID 5330174 |
| | | | | | | 0..1 5330176 | PartyFormatted Name 5330178 |
| | | | | | ProjectTeam MemberParty 5330180 | 0..n 5330182 | |
| | | | | | | 1 5330184 | PartyID 5330186 |
| | | | | | | 0..1 5330188 | PartyFormatted Name 5330190 |
| Log 5330192 | | Log 5330194 | | | | 1 5330196 | Log 5330198 |

FIG. 534

| Package | level 1 | level 2 | level 3 | Cardinality | Datatype Name |
|---|---|---|---|---|---|
| ProjectWork Breakdown Structure Element Attachment ByWork Breakdown Structure ElementID QueryMessage 534000 | ProjectWork Breakdown Structure Element Attachment ByWork Breakdown Structure ElementID Query-Message 534002 | | | | ProjectWorkBreakdown StructureElement AttachmentBy Work-Breakdown Structure ElementID QueryMessage 534004 |
| Selection 534006 | | ProjectWork Breakdown Structure Element Attachment Selection ByWork Breakdown Structure ElementID 534008 | | 1 534010 | |
| | | | ProjectWorkBreakdown StructureElementID 534012 | 1 534014 | ProjectWorkBreakdown StructureElementID 534016 |

FIG. 535-1

| Package | level 1 | level 2 | level 3 | level 4 | level 5 | Cardinality | Datatype Name |
|---|---|---|---|---|---|---|---|
| ProjectWork Breakdown Structure Element Attach-mentBy Work-Breakdown Structure ElementID Response 535000 | ProjectWork Breakdown StructureElement Attachment By-Work Breakdown Structure Ele-mentID Re-sponse Message 535002 | | | | | | ProjectWork Breakdown Structure Element Attach-mentBy WorkBreakdown Structure ElementID Re-sponse Message 535004 |
| Project 535006 | | Project 535008 | | | | 0..1 535010 | |
| | | | ID 535012 | | | 1 535014 | ProjectID 535016 |
| | | | WorkBreakdown StructureElement 535018 | | | 0..1 535020 | |

FIG. 535-2

| Package | level 1 | level 2 | level 3 | level 4 | level 5 | Cardinality | Datatype Name |
|---|---|---|---|---|---|---|---|
| | | | | ID 535022 | | 1 535024 | ProjectWork Breakdown Structure ElementID 535026 |
| | | | | Attachment 535028 | | 0..n 535030 | |
| | | | | | Name 535032 | 1 535034 | LANGUAGEINDEPENDENT_ EXTENDED_ Name 535036 |
| | | | | | Alternative DocumentID 535038 | 1 535040 | Alternative DocumentID 535042 |
| | | | | | TypeCode 535044 | 1 535046 | DocumentType Code 535048 |
| | | | | | VersionID 535050 | 1 535052 | VersionID 535054 |
| Log 535056 | | Log 535058 | | | | 1 535060 | Log 535062 |

FIG. 536

| Package | level 1 | level 2 | level 3 | Cardinality | Datatype Name |
|---|---|---|---|---|---|
| ProjectWork Breakdown Structure ElementByID QueryMessage 536000 | ProjectWork Breakdown Structure ElementByID QueryMessage 536002 | | | | ProjectWork Breakdown Structure ElementByID QueryMessage 536004 |
| Selection 536006 | | ProjectWork Breakdown Structure Element Selection-ByID 536008 | | 1 536010 | |
| | | | ProjectID 536012 | 1 536014 | ProjectID 536016 |

FIG. 537

| Package | level 1 | level 2 | level 3 | level 4 | Cardinality | Datatype Name |
|---|---|---|---|---|---|---|
| ProjectWork Breakdown Structure ElementByID Response 537000 | ProjectWorkBreakdown StructureElementByID ResponseMessage 537002 | | | | | ProjectWork Breakdown Structure ElementByID Response Message 537004 |
| Project 537006 | | Project 537008 | | | 0..1 537010 | |
| | | | WorkBreakdown StructureElement 537012 | | 0...n 537014 | |
| | | | | ID 537016 | 1 537018 | ProjectWork Breakdown Structure ElementID 537020 |
| | | | | Description 537022 | 0..1 537024 | SHORT_ Description 537026 |
| Log 537028 | | Log 537030 | | | 1 537032 | Log 537034 |

FIG. 538

| Package | level 1 | level 2 | level 3 | Cardinality | Datatype Name |
|---|---|---|---|---|---|
| ProjectWork Breakdown Structure ElementBy WorkBreakdown Structure ElementID QueryMessage 538000 | ProjectWorkBreakdownStructure ElementByWork Breakdown StructureElementID QueryMessage 538002 | | | | ProjectWork BreakdownStructure ElementByWork BreakdownStructure ElementID QueryMessage 538004 |
| MessageHeader 538006 | | MessageHeader 538008 | | 0..1 538010 | BasicBusiness DocumentMessage Header 538012 |
| Selection 538014 | | ProjectWork Breakdown Structure Element SelectionByWork Breakdown Structure ElementID 538016 | | 1 538018 | |
| | | | ProjectWork-BreakdownStructure ElementID 538020 | 1 538022 | ProjectWork BreakdownStructure ElementID 538024 |

FIG. 539-1

| Package | level 1 | level 2 | level 3 | level 4 | level 5 | Cardinality | Datatype Name |
|---|---|---|---|---|---|---|---|
| ProjectWork Breakdown StructureElementBy WorkBreakdown StructureElementID Response 539000 | ProjectWork Breakdown Structure ElementBy Work Breakdown Structure ElementID Response Message 539002 | | | | | | ProjectWork Breakdown StructureElementBy Work-Breakdown Structure ElementID Response Message 539004 |
| MessageHeader 539006 | | Message Header 539008 | | | | 0..1 539010 | BasicBusiness Document Message-Header 539012 |
| Project 539014 | | Project 539016 | | | | 0..1 539018 | |
| Task 539020 | | | Task 539022 | | | 1 539024 | |

FIG. 539-2

| Package | level 1 | level 2 | level 3 | level 4 | level 5 | Cardinality | Datatype Name |
|---|---|---|---|---|---|---|---|
| Work Breakdown Structure Element 539026 | | | | Work Breakdown Structure Element 539028 | | 0..1 539030 | |
| | | | | | ID 539032 | 1 539034 | ProjectWork Breakdown Structure Ele-mentID 539036 |
| | | | | | Description 539038 | 0..1 539040 | SHORT_ De-scription 539042 |
| Log 539044 | | Log 539046 | | | | 1 539048 | Log 539050 |

FIG. 543

| Package | level 1 | level 2 | level 3 | Cardinality | DatatypeName |
|---|---|---|---|---|---|
| ProjectChangeCreate-ConfirmationMessage 543000 | ProjectChangeCre-ateConfirmationMes-sage 543002 | | | | ProjectChangeMessage 543004 |
| MessageHeader 543006 | | MessageHeader 543008 | | 0..1 543010 | BasicBusinessDocu-mentMessageHeader 543012 |
| ProjectChange 543014 | | ProjectChange 543016 | | 0..1 543018 | |
| | | | ID 543020 | 1 543022 | ProjectChangeID 543024 |
| Log 543026 | | Log 543028 | | 1 543030 | Log 543032 |

FIG. 544-1

| Package | level1 | level2 | level3 | level4 | level5 | Cardinality | Datatype Name |
|---|---|---|---|---|---|---|---|
| ProjectChangeCreateRequestMessage 544000 | ProjectChangeCreateRequestMessage 544002 | | | | | | ProjectChangeMessage 544004 |
| MessageHeader 544006 | | MessageHeader 544008 | | | | 0..1 544010 | BasicBusinessDocumentMessageHeader 544012 |
| ProjectChange 544014 | | ProjectChange 544016 | | | | 1 544018 | |
| | | | ProjectWorkBreakdownStructureElementID 544020 | | | 0..1 544022 | ProjectWorkBreakdownStructureElementID 544024 |
| | | | IssueProjectIssueCategoryCatalogueID 544026 | | | 0..1 544028 | ProjectIssueCategoryCatalogueID 544030 |
| | | | ParentIssueProjectIssueCategoryID 544032 | | | 0..1 544034 | ProjectIssueCategoryID 544036 |

FIG. 544-2

| Package | level1 | level2 | level3 | level4 | level5 | Cardinality | Datatype Name |
|---|---|---|---|---|---|---|---|
| | | | IssueProjectIssue-CategoryID 544038 | | | 0..1 544040 | ProjectIs-sueCate-goryID 544042 |
| | | | MiscellaneousProjec-tIssueCategoryCata-logueID 544044 | | | 0..1 544046 | ProjectIs-sueCate-goryCata-logueID 544048 |
| | | | ParentMiscellane-ousProjectIssueCate-goryID 544050 | | | 0..1 544052 | ProjectIs-sueCate-goryID 544054 |
| | | | MiscellaneousProjec-tIssueCategoryID 544056 | | | 0..1 544058 | ProjectIs-sueCate-goryID 544060 |
| | | | CauseProjectIssue-CategoryCatalogueID 544062 | | | 0..1 544064 | ProjectIs-sueCate-goryCata-logueID 544066 |
| | | | ParentCauseProjectIs-sueCategoryID 544068 | | | 0..1 544070 | ProjectIs-sueCate-goryID 544072 |
| | | | CauseProjectIssue-CategoryID 544074 | | | 0..1 544076 | ProjectIs-sueCate-goryID 544078 |

FIG. 544-3

| Package | level1 | level2 | level3 | level4 | level5 | Cardinality | Datatype Name |
|---|---|---|---|---|---|---|---|
| | | | CauseDescription 544080 | | | 0..1 544082 | SHORT_Description 544084 |
| | | | ReporterInternalID 544086 | | | 0..1 544088 | PartyInternalID 544090 |
| | | | ReportedDateTime 544092 | | | 0..1 544094 | TIMEZONEINDEPENDENT_DateTime 544096 |
| | | | TypeCode 544098 | | | 1 5440100 | ProjectChangeTypeCode 5440102 |
| | | | ImportanceCode 5440104 | | | 0..1 5440106 | ImportanceCode 5440108 |
| | | | ApprovalProbabilityCode 5440110 | | | 0..1 5440112 | ProjectChangeApprovalProbabilityCode 5440114 |

FIG. 544-4

| Package | level1 | level2 | level3 | level4 | level5 | Cardinality | Datatype Name |
|---|---|---|---|---|---|---|---|
| | | | EstimatedCost 5440116 | | | 0..1 5440118 | Amount 5440120 |
| | | | RequestedCost 5440122 | | | 0..1 5440124 | Amount 5440126 |
| | | | AcceptedCost 5440128 | | | 0..1 5440130 | Amount 5440132 |
| | | | ReferenceNumber-Comment 5440134 | | | 0..1 5440136 | LEN20_Comment 5440138 |
| | | | Description 5440140 | | | 0..1 5440142 | SHORT_Description 5440144 |
| | | | CauseDetailedText 5440146 | | | 0..1 5440148 | Text 5440150 |
| | | | OperationDetailedText 5440152 | | | 0..1 5440154 | Text 5440156 |

FIG. 544-5

| Package | level1 | level2 | level3 | level4 | level5 | Cardinality | Datatype Name |
|---|---|---|---|---|---|---|---|
| | | | ConsequencesDetailedText 5440158 | | | 0..1 5440160 | Text 5440162 |
| | | | EvaluationDetailedText 5440164 | | | 0..1 5440166 | Text 5440168 |
| | | | CompanyCode 5440170 | | | 0..1 5440172 | CompanyID 5440174 |
| | | | CurrencyCode 5440176 | | | 0..1 5440178 | CurrencyCode 5440180 |
| | | | DetailedText 5440182 | | | 0..1 5440184 | Text 5440186 |
| Task 5440188 | | | Task 5440190 | | | 0..n 5440192 | |
| | | | | EmployeeResponsibleInternalID 5440194 | | 0..1 5440196 | PartyInternalID 5440198 |
| | | | | TaskProjectIssueCategoryCatalogueID 5440200 | | 0..1 5440202 | ProjectIssueCategoryCatalogueID 5440204 |

FIG. 544-6

| Package | level1 | level2 | level3 | level4 | level5 | Cardinality | Datatype Name |
|---|---|---|---|---|---|---|---|
| | | | | ParentTaskProjectIssueCategoryID 5440206 | | 0..1 5440208 | ProjectIssueCategoryID 5440210 |
| | | | | TaskProjectIssueCategoryID 5440212 | | 0..1 5440214 | ProjectIssueCategoryID 5440216 |
| | | | | EmployeeResponsibleInternalTypeCode 5440218 | | 0..1 5440220 | BusinessObjectTypeCode 5440222 |
| | | | | PlannedProcessingPeriod 5440224 | | 0..1 5440226 | UPPEROPEN_TIMEZONEINDEPENDENT_DateTimePeriod 5440228 |
| | | | | Description 5440230 | | 0..1 5440232 | SHORT_Description 5440234 |
| | | | | DetailedText 5440236 | | 0..1 5440238 | Text 5440240 |

FIG. 544-7

| Package | level1 | level2 | level3 | level4 | level5 | Cardinality | Datatype Name |
|---|---|---|---|---|---|---|---|
| | | | | Ordinal-Number-Value 5440242 | | 1 5440244 | OrdinalNumberValue 5440246 |
| Activity 5440248 | | | Activity 5440250 | | | 0..n 5440252 | PriorityCode 5440254 |
| | | | | ActivityProjectIssue-Category-CatalogueID 5440256 | | 0..1 5440258 | ProjectIssueCategoryCatalogueID 5440260 |
| | | | | ParentActivityProjectIssue-CategoryID 5440262 | | 0..1 5440264 | ProjectIssueCategoryID 5440266 |
| | | | | ActivityProjectIssue-CategoryID 5440268 | | 0..1 5440270 | ProjectIssueCategoryID 5440272 |
| | | | | ProcessingPeriod 5440274 | | 0..1 5440276 | UPPEROPEN_TIMEZONEINDEPENDENT_DateTimePeriod 5440278 |

FIG. 544-8

| Package | level1 | level2 | level3 | level4 | level5 | Cardinality | Datatype Name |
|---|---|---|---|---|---|---|---|
| | | | | Description 5440280 | | 0..1 5440282 | SHORT_Description 5440284 |
| | | | | DetailedText 5440286 | | 0..1 5440288 | Text 5440290 |
| | | | | OrdinalNumberValue 5440292 | | 1 5440294 | OrdinalNumberValue 5440296 |
| BusinessTransactionDocumentReference 5440298 | | | BusinessTransactionDocumentReference 5440300 | | | 0..1 5440302 | |
| | | | | SalesOrderReference 5440304 | | 0..1 5440306 | BusinessTransactionDocumentReference 5440308 |
| | | | | DeliveryReference 5440310 | | 0..1 5440312 | BusinessTransactionDocumentReference 5440314 |
| Party 5440316 | | | Party 5440318 | | | 0..n 5440320 | |

FIG. 544-9

| Package | level1 | level2 | level3 | level4 | level5 | Cardinality | Datatype Name |
|---|---|---|---|---|---|---|---|
| | | | | BuyerParty 5440322 | | 0..1 5440324 | |
| | | | | | InternalID 5440326 | 1 5440328 | PartyInter-nalID 5440330 |
| | | | | Vendor-Party 5440332 | | 0..1 5440334 | |
| | | | | | InternalID 5440336 | 1 5440338 | PartyInter-nalID 5440340 |
| | | | | Party 5440342 | | 0..1 5440344 | |
| | | | | | InternalID 5440346 | 1 5440348 | PartyInter-nalID 5440350 |
| | | | | | RoleCode 5440352 | 1 5440354 | PartyRole-Code 5440356 |

FIG. 550

| Package | level 1 | level 2 | level 3 | Cardinality | Datatype Name |
|---|---|---|---|---|---|
| ProjectIssueCategory-CatalogueCategoryBy-IDQueryMessage_sync 550000 | ProjectIssueCategory-CatalogueCategoryBy-IDQueryMessage_sync 550002 | | | | ProjectIssueCategory-CatalogueCategoryBy-IDQueryMessage_sync 550004 |
| Selection 550006 | | ProjectIssueCate-goryCatalogueCate-gorySelectionByID 550008 | | 1 550010 | ProjectIssueCategory-CatalogueSelectionByID 550012 |
| | | | ID 550014 | 1 550016 | ProjectIssueCategory-CatalogueID 550018 |
| | | | CategoryParent-ProjectIssue-CategoryID 550020 | 0..1 550022 | ProjectIssueCategoryID (qualifier: Parent) 550024 |
| | | | ProfileIssueCate-goryFilterCode 550026 | 0..1 550028 | IssueCategoryFilterCode 550030 |
| | | | LanguageCode 550032 | 0..1 550034 | LanguageCode 550036 |

FIG. 551-1

| Package | level 1 | level 2 | level 3 | level 4 | Cardinality | Datatype Name |
|---|---|---|---|---|---|---|
| ProjectIssueCategoryCatalogueCategoryByIDResponseMessage_sync 551000 | ProjectIssueCategoryCatalogueCategoryByIDResponseMessage_sync 551002 | | | | | ProjectIssueCategoryCatalogueMessage_sync 551004 |
| ProjectIssueCategoryCatalogue 551006 | | ProjectIssueCategoryCatalogue 551008 | | | 0..1 551010 | ... |
| | | | ID 551012 | | 1 551014 | ProjectIssueCategoryCatalogueID 551016 |
| | | | ProjectIssueCategoryTypeCode 551018 | | 1 551020 | ProjectIssueCategoryTypeCode 551022 |

FIG. 551-2

| Package | level 1 | level 2 | level 3 | level 4 | Cardinality | Datatype Name |
|---|---|---|---|---|---|---|
| | | | Name 551024 | | 0..1 551026 | MEDIUM_Name (Qualifier: Cata-logue) 551028 |
| | | | ProjectIssue-Cate-goryTypeNa me 551030 | | 0..1 551032 | MEDIUM_Name (Qualifier: Cate-goryType) 551034 |
| Category 551036 | | | Category 551038 | | 0..n 551040 | ... |
| | | | | ProjectIssue-CategoryID 551042 | 1 551044 | ProjectIssue-CategoryID 551046 |
| | | | | ParentProjectIs-sueCategoryID 551048 | 0..1 551050 | ProjectIssue-CategoryID (qualifier: Parent) 551052 |

FIG. 551-3

| Package | level 1 | level 2 | level 3 | level 4 | Cardinality | Datatype Name |
|---|---|---|---|---|---|---|
| | | | | ProjectIssue-CategoryName 551054 | 0..1 551056 | MEDIUM_Name (qualifier: Cate-gory) 551058 |
| | | | | ProjectIssue-CategoryDe-scription 551060 | 0..1 551062 | MEDIUM_Descrip tion (qualifier: Category) 551064 |
| Log 551066 | | Log 551068 | | | 1 551070 | Log 551072 |

FIG. 552

| Package | level 1 | level 2 | level 3 | Cardinality | Datatype Name |
|---|---|---|---|---|---|
| ProjectIssueCategoryCatalogueSimpleByProfileProjectChangeTypeCodeQueryMessage_sync 552000 | ProjectIssueCategoryCatalogueSimpleByProfileProjectChangeTypeCodeQueryMessage_sync 552002 | | | | ProjectIssueCategoryCatalogueSimpleByProfileProjectChangeTypeCodeQueryMessage_sync 552004 |
| Selection 552006 | | ProjectIssueCategoryCatalogueSimpleSelectionByProfileProjectChangeTypeCode 552008 | | 1 552010 | ProjectIssueCategoryCatalogueSimpleSelectionByProfileProjectChangeTypeCode 552012 |
| | | | ProfileProjectChangeTypeCode 552014 | 1 552016 | ProjectChangeTypeCode 552018 |
| | | | LanguageCode 552020 | 0..1 552022 | LanguageCode 552024 |

FIG. 553-1

| Package | level 1 | level 2 | level 3 | Cardinality | Datatype Name |
|---|---|---|---|---|---|
| ProjectIssueCategoryCatalogueSimpleByProfileProjectChangeTypeCodeResponseMessage_sync 553000 | ProjectIssueCategoryCatalogueSimpleByProfileProjectChangeTypeCodeResponseMessage_sync 553002 | | | | ProjectIssueCategoryCatalogueSimpleByProfileProjectChangeTypeCodeResponseMessage_sync 553004 |
| ProjectIssueCategoryCatalogue 553006 | | ProjectIssueCategoryCatalogue 553008 | | 0..n 553010 | ... |
| | | | ID 553012 | 1 553014 | ProjectIssueCategoryCatalogueID 553016 |
| | | | ProjectIssueCategoryTypeCode 553018 | 1 553020 | ProjectIssueCategoryCatalogueTypeCode 553022 |
| | | | ProjectIssueCategoryTypeName 553024 | 0..1 553026 | MEDIUM_Name (qualifier: CategoryType) 553028 |

FIG. 553-2

| Package | level 1 | level 2 | level 3 | Cardinality | Datatype Name |
|---|---|---|---|---|---|
| | | | Name 553030 | 0..1 553032 | MEDIUM_Name (qualifier: Catalogue) 553034 |
| Log 553036 | | Log 553038 | | 1 553040 | Log 553042 |

FIG. 559-1

| Package | level 1 | level 2 | level 3 | Cardinality | Datatype Name |
|---|---|---|---|---|---|
| QualityIssueCategory-CatalogueCategoryBy-IDQueryMessage_sync 559000 | QualityIssueCategoryCata-logueCategoryByIDQue-ryMessage_sync 559002 | | | | QualityIssueCategory-CatalogueCategoryBy-IDQueryMessage_sync 559004 |
| Selection 559006 | | QualityIssueCate-goryCatalogue-CategorySelec-tionByID 559008 | | 1 559010 | QualityIssueCategory-CatalogueSelectionByID 559012 |
| | | | ID 559014 | 1 559016 | QualityIssueCategory-CatalogueID 559018 |
| | | | CategoryPar-entQualityIs-sueCate-goryID 559020 | 0..1 559022 | QualityIssueCategoryID (qualifier: Parent) 559024 |
| | | | ProfileIssue-CategoryFil-terCode 559026 | 0..1 559028 | IssueCategoryFilterCode 559030 |

FIG. 559-2

| Package | | level 1 | level 2 | level 3 | Cardinality | Datatype Name |
|---|---|---|---|---|---|---|
| | | | | Language-Code 559032 | 0..1 559034 | LanguageCode 559036 |

FIG. 560-1

| Package | level 1 | level 2 | level 3 | level 4 | Cardinality | Datatype Name |
|---|---|---|---|---|---|---|
| QualityIssueCategoryCatalogueCategoryByIDResponseMessage_sync 560000 | QualityIssueCategoryCatalogueCategoryByIDResponseMessage_sync 560002 | | | | | QualityIssueCategoryCatalogueMessage_sync 560004 |
| QualityIssueCategoryCatalogue 560006 | | QualityIssueCategoryCatalogue 560008 | | | 0..1 560010 | ... |
| | | | ID 560012 | | 1 560014 | QualityIssueCategoryCatalogueID 560016 |
| | | | QualityIssueCategoryTypeCode 560018 | | 1 560020 | QualityIssueCategoryTypeCode 560022 |
| | | | Name 560024 | | 0..1 560026 | MEDIUM_Name (Qualifier: Catalogue) 560028 |

FIG. 560-2

| Package | level 1 | level 2 | level 3 | level 4 | Cardinality | Datatype Name |
|---|---|---|---|---|---|---|
| | | | QualityIssue-Cate-goryTypeName 560030 | | 0..1 560032 | MEDIUM_Name (Qualifier: CategoryType) 560034 |
| Category 560036 | | | Category 560038 | | 0..n 560040 | ... |
| | | | | QualityIssue-CategoryID 560042 | 1 560044 | QualityIssueCategoryID 560046 |
| | | | | ParentQuality-IssueCate-goryID 560048 | 0..1 560050 | QualityIssueCategoryID (qualifier: Parent) 560052 |
| | | | | QualityIssue-CategoryName 560054 | 0..1 560056 | MEDIUM_Name (qualifier: Category) 560058 |
| | | | | QualityIssue-CategoryDe-scription 560060 | 0..1 560062 | MEDIUM_Description (qualifier: Category) 560064 |
| Log 560066 | | Log 560068 | | | 1 560070 | Log 560072 |

FIG. 561

| Package | level 1 | level 2 | level 3 | Cardinality | Datatype Name |
|---|---|---|---|---|---|
| QualityIssueCategoryCatalogueSimpleByProfileQualityIssueNotificationTypeCodeQueryMessage_sync 561000 | QualityIssueCategoryCatalogueSimpleByProfileQualityIssueNotificationTypeCodeQueryMessage_sync 561002 | | | | QualityIssueCategoryCatalogueSimpleByProfileQualityIssueNotificationTypeCodeQueryMessage_sync 561004 |
| Selection 561006 | | QualityIssueCategoryCatalogueSimpleSelectionByProfileQualityIssueNotificationTypeCode 561008 | | 1 561010 | QualityIssueCategoryCatalogueSimpleSelectionByProfileQualityIssueNotificationTypeCode 561012 |
| | | | ProfileQualityIssueNotificationTypeCode 561014 | 1 561016 | QualityIssueNotificationTypeCode 561018 |
| | | | LanguageCode 561020 | 0..1 561022 | LanguageCode 561024 |

FIG. 562

| Package | level 1 | level 2 | level 3 | Cardinality | Datatype Name |
|---|---|---|---|---|---|
| QualityIssueCategoryCatalogueSimpleByProfileQualityIssueNotification-TypeCodeResponse-Message_sync 562000 | QualityIssueCategoryCatalogueSimpleByProfile QualityIssueNotification-TypeCodeResponse-Message_sync 562002 | | | | QualityIssueCategoryCatalogueSimpleByProfileQualityIssueNotificationTypeCodeRe-sponseMessage_sync 562004 |
| QualityIssueCate-goryCatalogue 562006 | | QualityIssue-Category-Catalogue 562008 | | 0..n 562010 | ... |
| | | | ID 562012 | 1 562014 | QualityIssueCategoryCata-logueID 562016 |
| | | | QualityIssueCate-goryTypeCode 562018 | 1 562020 | QualityIssueCategoryCata-logueTypeCode 562022 |
| | | | QualityIssueCate-goryTypeName 562024 | 0..1 562026 | MEDIUM_Name (qualifier: CategoryType) 562028 |
| | | | Name 562030 | 0..1 562032 | MEDIUM_Name (qualifier: Catalogue) 562034 |
| Log 562036 | | Log 562038 | | 1 562040 | Log 562042 |

FIG. 572

| Package | | level 1 | level 2 | level 3 | Cardinality | Datatype Name |
|---|---|---|---|---|---|---|
| QualityIssueNotificationByID-QueryMessage_sync 572000 | | QualityIssueNotificationByIDQueryMessage_sync 572002 | | | | QualityIssueNotificationByIDQueryMessage_sync 572004 |
| | Selection 572006 | | QualityIssueNotificationSelectionByID 572008 | | 1 572010 | |
| | | | | ID 572012 | 1 572014 | QualityIssueNotificationID 572016 |

FIG. 573-1

| Package | level 1 | level 2 | level 3 | level 4 | level 5 | Cardinality | Datatype Name |
|---|---|---|---|---|---|---|---|
| QualityIssueNotification-ByIDResponseMes-sage_sync 573000 | QualityIs-sueNotifi-cationBy-IDRespon-seMes-sage_sync 573002 | | | | | | QualityIssueNoti-ficationByIDRe-sponseMes-sage_sync 573004 |
| QualityIssueNotifica-tion 573006 | | QualityIs-sueNotifi-cation 573008 | | | | 0..1 573010 | |
| | | | ID 573012 | | | 1 573014 | QualityIssueNoti-ficationID 573016 |
| | | | External-QualityIs-sueNotifi-cation-Reference 573018 | | | 0..1 573020 | BusinessTransac-tionDocumen-tReference 573022 |

FIG. 573-2

| Package | level 1 | level 2 | level 3 | level 4 | level 5 | Cardinality | Datatype Name |
|---|---|---|---|---|---|---|---|
| | | | SystemAdministrativeData 573024 | | | 1 573026 | SystemAdministrativeData 573028 |
| | | | StatusObject 573030 | | | 1 573032 | StatusObject 573034 |
| | | | IssueCategoryFilterID 573036 | | | 1 573038 | IssueCategoryFilterCode 573040 |
| | | | IssueQualityIssueCategoryCatalogueID 573042 | | | 0..1 573044 | QualityIssueCategoryCatalogueID 573046 |
| | | | IssueParentQualityIssueCategoryID 573048 | | | 0..1 573050 | QualityIssueCategoryID 573052 |

FIG. 573-3

| Package | level 1 | level 2 | level 3 | level 4 | level 5 | Cardinality | Datatype Name |
|---|---|---|---|---|---|---|---|
| | | | IssueParentQuality-IssueCategoryName 573054 | | | 0..1 573056 | MEDIUM_Name 573058 |
| | | | IssueQualityIssue-CategoryID 573060 | | | 0..1 573062 | QualityIssue-CategoryID 573064 |
| | | | IssueQualityIssue-Category-Name 573066 | | | 0..1 573068 | MEDIUM_Name 573070 |
| | | | Reporter-InternalID 573072 | | | 1 573074 | PartyInternalID 573076 |
| | | | Reported-DateTime 573078 | | | 1 573080 | TIMEZONEINDEPENDENT_DateTime 573082 |

FIG. 573-4

| Package | level 1 | level 2 | level 3 | level 4 | level 5 | Cardinality | Datatype Name |
|---|---|---|---|---|---|---|---|
| | | | Request-edProcess-ingPeriod 573084 | | | 0..1 573086 | UPPEROPEN_TIMEZONEINDEPENDENT_DateTimePeriod 573088 |
| | | | Machin-eryBreak-downIndi-cator 573090 | | | 0..1 573092 | Indicator 573094 |
| | | | Machin-eryMal-functionPe-riod 573096 | | | 0..1 573098 | UPPEROPEN_TIMEZONEINDEPENDENT_DateTimePeriod 5730100 |
| | | | TypeCode 5730102 | | | 1 5730104 | QualityIssueNoti-ficationTypeCode 5730106 |

FIG. 573-5

| Package | level 1 | level 2 | level 3 | level 4 | level 5 | Cardinality | Datatype Name |
|---|---|---|---|---|---|---|---|
| | | | TypeName 5730108 | | | 0..1 5730110 | MEDIUM_Name 5730112 |
| | | | Impor-tanceCode 5730114 | | | 0..1 5730116 | ImportanceCode 5730118 |
| | | | Importance Name 5730120 | | | 0..1 5730122 | MEDIUM_Name 5730124 |
| | | | Com-plaintQuan tity 5730126 | | | 0..1 5730128 | Quantity 5730130 |
| | | | Refer-enceQuan-tity 5730132 | | | 0..1 5730134 | Quantity 5730136 |

FIG. 573-6

| Package | level 1 | level 2 | level 3 | level 4 | level 5 | Cardinality | Datatype Name |
|---|---|---|---|---|---|---|---|
| | | | Internal-Noncon-form-ingQuantity 5730138 | | | 0..1 5730140 | Quantity 5730142 |
| | | | External-Noncon-form-ingQuantity 5730144 | | | 0..1 5730146 | Quantity 5730148 |
| | | | Returned-Quantity 5730150 | | | 0..1 5730152 | Quantity 5730154 |
| | | | Returned-Date 5730156 | | | 0..1 5730158 | Date 5730160 |
| | | | Description 5730162 | | | 0..1 5730164 | SHORT_Description 5730166 |

FIG. 573-7

| Package | level 1 | level 2 | level 3 | level 4 | level 5 | Cardinality | Datatype Name |
|---|---|---|---|---|---|---|---|
| | | | Detailed-Text 5730168 | | | 0..1 5730170 | Text 5730172 |
| Item 5730174 | | | Item 5730176 | | | 0..n 5730178 | |
| | | | | ID 5730180 | | 1 5730182 | QualityIssueNotificationItemID 5730184 |
| | | | | SystemAdministrativeData 5730186 | | 1 5730188 | SystemAdministrativeData 5730190 |
| | | | | MaterialInternalID 5730192 | | 0..1 5730194 | ProductInternalID 5730196 |
| | | | | MaterialDescription 5730198 | | 0..1 5730200 | SHORT_Description 5730202 |

FIG. 573-8

| Package | level 1 | level 2 | level 3 | level 4 | level 5 | Cardinality | Datatype Name |
|---|---|---|---|---|---|---|---|
| | | | | MaterialIn-spection-SampleID 5730204 | | 0..1 5730206 | MaterialInspec-tionSampleID 5730208 |
| | | | | MaterialIn-spection-SubsetOp-erationID 5730210 | | 0..1 5730212 | MaterialInspec-tionSubsetOpera-tionID 5730214 |
| | | | | MaterialIn-spection-SubsetOp-erationDe-scription 5730216 | | 0..1 5730218 | MEDIUM_Descrip tion 5730220 |
| | | | | MaterialIn-spection-SubsetOp-eration-WorkCen-treID 5730222 | | 0..1 5730224 | WorkCentreID 5730226 |

FIG. 573-9

| Package | level 1 | level 2 | level 3 | level 4 | level 5 | Cardinality | Datatype Name |
|---|---|---|---|---|---|---|---|
| | | | | MaterialIn-spection-SubsetOp-eration-WorkCen-treDescrip-tion 5730228 | | 0..1 5730230 | SHORT_Description 5730232 |
| | | | | MaterialIn-spection-SubsetOp-eration-WorkCen-trePlantID 5730234 | | 0..1 5730236 | PlantID 5730238 |
| | | | | MaterialIn-spection-SubsetOp-erationIn-spec-tionActiv-ityID 5730240 | | 0..1 5730242 | MaterialInspec-tionSubsetOpera-tionInspectionAc-tivityID 5730244 |

FIG. 573-10

| Package | level 1 | level 2 | level 3 | level 4 | level 5 | Cardinality | Datatype Name |
|---|---|---|---|---|---|---|---|
| | | | | MaterialInspectionSubsetOperationInspectionActivityDescription 5730246 | | 0..1 5730248 | MEDIUM_Description 5730250 |
| | | | | DefectTypeQualityIssueCategoryCatalogueID 5730252 | | 0..1 5730254 | QualityIssueCategoryCatalogueID 5730256 |
| | | | | DefectTypeParentQualityIssueCategoryID 5730258 | | 0..1 5730260 | QualityIssueCategoryID 5730262 |

FIG. 573-11

| Package | level 1 | level 2 | level 3 | level 4 | level 5 | Cardinality | Datatype Name |
|---|---|---|---|---|---|---|---|
| | | | | DefectTypeParentQualityIssueCategoryName 5730264 | | 0..1 5730266 | MEDIUM_Name 5730268 |
| | | | | DefectTypeQualityIssueCategoryID 5730270 | | 0..1 5730272 | QualityIssueCategoryID 5730274 |
| | | | | DefectTypeQualityIssueCategoryName 5730276 | | 0..1 5730278 | MEDIUM_Name 5730280 |

FIG. 573-12

| Package | level 1 | level 2 | level 3 | level 4 | level 5 | Cardinality | Datatype Name |
|---|---|---|---|---|---|---|---|
| | | | | DefectLocation-QualityIssueCategoryCatalogueID 5730282 | | 0..1 5730284 | QualityIssue-CategoryCatalogueID 5730286 |
| | | | | DefectLocationParentQuality-IssueCategoryID 5730288 | | 0..1 5730290 | QualityIssue-CategoryID 5730292 |
| | | | | DefectLocationParentQuality-IssueCategoryName 5730294 | | 0..1 5730296 | MEDIUM_Name 5730298 |

FIG. 573-13

| Package | level 1 | level 2 | level 3 | level 4 | level 5 | Cardinality | Datatype Name |
|---|---|---|---|---|---|---|---|
| | | | | DefectLocation-QualityIssueCategoryID 5730300 | | 0..1 5730302 | QualityIssue-CategoryID 5730304 |
| | | | | DefectLocation-QualityIssueCategoryName 5730306 | | 0..1 5730308 | MEDIUM_Name 5730310 |
| | | | | Defect-Number-Value 5730312 | | 0..1 5730314 | NumberValue 5730316 |
| | | | | DefectClass-Code 5730318 | | 0..1 5730320 | DefectClassCode 5730322 |

FIG. 573-14

| Package | level 1 | level 2 | level 3 | level 4 | level 5 | Cardinality | Datatype Name |
|---|---|---|---|---|---|---|---|
| | | | | DefectClassName 5730324 | | 0..1 5730326 | MEDIUM_Name 5730328 |
| | | | | DefectWeightingClassCode 5730330 | | 0..1 5730332 | DefectWeightingClassCode 5730334 |
| | | | | DefectWeightingClassName 5730336 | | 0..1 5730338 | MEDIUM_Name 5730340 |
| | | | | SystematicIndicator 5730342 | | 0..1 5730344 | Indicator 5730346 |
| | | | | InternalNonconformingQuantity 5730348 | | 0..1 5730350 | Quantity 5730352 |

FIG. 573-15

| Package | level 1 | level 2 | level 3 | level 4 | level 5 | Cardinality | Datatype Name |
|---|---|---|---|---|---|---|---|
| | | | | External-Noncon-form-ingQuantity 5730354 | | 0..1 5730356 | Quantity 5730358 |
| | | | | Description 5730360 | | 0..1 5730362 | SHORT_Description 5730364 |
| | | | | Detailed-Text 5730366 | | 0..1 5730368 | Text 5730370 |
| | | | | Ordinal-Number-Value 5730372 | | 0..1 5730374 | OrdinalNumber-Value 5730376 |
| Cause 5730378 | | | | Cause 5730380 | | 0..n 5730382 | |
| | | | | | QualityIs-sueNotifi-cation-CauseID 5730384 | 1 5730386 | QualityIssueNoti-ficationCauseID 5730388 |

FIG. 573-16

| Package | level 1 | level 2 | level 3 | level 4 | level 5 | Cardinality | Datatype Name |
|---|---|---|---|---|---|---|---|
| | | | | | SystemAdministrativeData 5730390 | 1 5730392 | SystemAdministrativeData 5730394 |
| | | | | | QualityIssueCategoryCatalogueID 5730396 | 0..1 5730398 | QualityIssueCategoryCatalogueID 5730400 |
| | | | | | ParentQualityIssueCategoryID 5730402 | 0..1 5730404 | QualityIssueCategoryID 5730406 |
| | | | | | ParentQualityIssueCategoryName 5730408 | 0..1 5730410 | MEDIUM_Name 5730412 |

FIG. 573-17

| Package | level 1 | level 2 | level 3 | level 4 | level 5 | Cardinality | Datatype Name |
|---|---|---|---|---|---|---|---|
| | | | | | QualityIssueCategoryID 5730414 | 0..1 5730416 | QualityIssue-CategoryID 5730418 |
| | | | | | QualityIssueCategoryName 5730420 | 0..1 5730422 | MEDIUM_Name 5730424 |
| | | | | | Description 5730426 | 0..1 5730428 | SHORT_Description 5730430 |
| | | | | | DetailedText 5730432 | 0..1 5730434 | Text 5730436 |
| | | | | | OrdinalNumberValue 5730438 | 0..1 5730440 | OrdinalNumberValue 5730442 |
| Task 5730444 | | | | Task 5730446 | | 0..n 5730448 | |

FIG. 573-18

| Package | level 1 | level 2 | level 3 | level 4 | level 5 | Cardinality | Datatype Name |
|---|---|---|---|---|---|---|---|
| | | | | | QualityIs-sueNotifi-cation-TaskID 5730450 | 1 5730452 | QualityIssueNoti-ficationTaskID 5730454 |
| | | | | | Syste-mAdminis-trativeData 5730456 | 1 5730458 | SystemAdminis-trativeData 5730460 |
| | | | | | StatusOb-ject 5730462 | 1 5730464 | StatusObject 5730466 |
| | | | | | Planned-Process-ingPeriod 5730468 | 0..1 5730470 | UPPEROPEN_TIMEZONEINDEPENDENT_DateTimePeriod 5730472 |
| | | | | | Employ-eeRespon-sibleInter-nalID 5730474 | 0..1 5730476 | PartyInternalID 5730478 |

FIG. 573-19

| Package | level 1 | level 2 | level 3 | level 4 | level 5 | Cardinality | Datatype Name |
|---|---|---|---|---|---|---|---|
| | | | | | EmployeeResponsibleInternalTypeCode 5730480 | 0..1 5730482 | BusinessObjectTypeCode 5730484 |
| | | | | | EmployeeResponsibleFormattedName 5730486 | 0..1 5730488 | LONG_Name 5730490 |
| | | | | | CompleterInternalID 5730492 | 0..1 5730494 | PartyInternalID 5730496 |
| | | | | | CompleterInternalName 5730498 | 0..1 5730500 | LONG_Name 5730502 |

FIG. 573-20

| Package | level 1 | level 2 | level 3 | level 4 | level 5 | Cardinality | Datatype Name |
|---|---|---|---|---|---|---|---|
| | | | | | CompletionDateTime 5730504 | 0..1 5730506 | TIMEZONEINDEPENDENT_DateTime 5730508 |
| | | | | | QualityIssueCategoryCatalogueID 5730510 | 0..1 5730512 | QualityIssueCategoryCatalogueID 5730514 |
| | | | | | ParentQualityIssueCategoryID 5730516 | 0..1 5730518 | QualityIssueCategoryID 5730520 |
| | | | | | ParentQualityIssueCategoryName 5730522 | 0..1 5730524 | MEDIUM_Name 5730526 |

FIG. 573-21

| Package | level 1 | level 2 | level 3 | level 4 | level 5 | Cardinality | Datatype Name |
|---|---|---|---|---|---|---|---|
| | | | | | QualityIs-sueCate-goryID 5730528 | 0..1 5730530 | QualityIssue-CategoryID 5730532 |
| | | | | | QualityIs-sueCate-goryName 5730534 | 0..1 5730536 | MEDIUM_Name 5730538 |
| | | | | | Description 5730540 | 0..1 5730542 | SHORT_Descripti on 5730544 |
| | | | | | Detailed-Text 5730546 | 0..1 5730548 | Text 5730550 |
| | | | | | Ordinal-Number-Value 5730552 | 0..1 5730554 | OrdinalNumber-Value 5730556 |
| Activity 5730558 | | | | Activity 5730560 | | 0..n 5730562 | |

FIG. 573-22

| Package | level 1 | level 2 | level 3 | level 4 | level 5 | Cardinality | Datatype Name |
|---|---|---|---|---|---|---|---|
| | | | | | QualityIs-sueNotifi-cationAc-tivityID 5730564 | 1 5730566 | QualityIssueNoti-ficationActivityID 5730568 |
| | | | | | Syste-mAdminis-trativeData 5730570 | 1 5730572 | SystemAdminis-trativeData 5730574 |
| | | | | | Process-ingPeriod 5730576 | 0..1 5730578 | UPPEROPEN_TIMEZONEINDEPENDENT_DateTimePeriod 5730580 |
| | | | | | QualityIs-sueCate-goryCata-logueID 5730582 | 0..1 5730584 | QualityIssue-CategoryCata-logueID 5730586 |

FIG. 573-23

| Package | level 1 | level 2 | level 3 | level 4 | level 5 | Cardinality | Datatype Name |
|---|---|---|---|---|---|---|---|
| | | | | | ParentQualityIssueCategoryID 5730588 | 0..1 5730590 | QualityIssueCategoryID 5730592 |
| | | | | | ParentQualityIssueCategoryName 5730594 | 0..1 5730596 | MEDIUM_Name 5730598 |
| | | | | | QualityIssueCategoryID 5730600 | 0..1 5730602 | QualityIssueCategoryID 5730604 |
| | | | | | QualityIssueCategoryName 5730606 | 0..1 5730608 | MEDIUM_Name 5730610 |
| | | | | | Description 5730612 | 0..1 5730614 | SHORT_Description 5730616 |

FIG. 573-24

| Package | level 1 | level 2 | level 3 | level 4 | level 5 | Cardinality | Datatype Name |
|---|---|---|---|---|---|---|---|
| | | | | | Detailed-Text 5730618 | 0..1 5730620 | Text 5730622 |
| | | | | | Ordinal-Number-Value 5730624 | 0..1 5730626 | OrdinalNumber-Value 5730628 |
| Task 5730630 | | | Task 5730632 | | | 0..n 5730634 | |
| | | | | ID 5730636 | | 1 5730638 | QualityIssueNoti-ficationTaskID 5730640 |
| | | | | Syste-mAdminis-trativeData 5730642 | | 1 5730644 | SystemAdminis-trativeData 5730646 |
| | | | | StatusOb-ject 5730648 | | 1 5730650 | StatusObject 5730652 |

FIG. 573-25

| Package | level 1 | level 2 | level 3 | level 4 | level 5 | Cardinality | Datatype Name |
|---|---|---|---|---|---|---|---|
| | | | | Planned-Process-ingPeriod 5730654 | | 0..1 5730656 | UPPEROPEN_TIMEZONEINDEPENDENT_DateTimePeriod 5730658 |
| | | | | Employ-eeRespon-sibleInter-nalID 5730660 | | 0..1 5730662 | PartyInternalID 5730664 |
| | | | | Employ-eeRespon-sibleInter-nalType-Code 5730666 | | 0..1 5730668 | BusinessOb-jectTypeCode 5730670 |
| | | | | Employ-eeRespon-sibleFor-matted-Name 5730672 | | 0..1 5730674 | LONG_Name 5730676 |

FIG. 573-26

| Package | level 1 | level 2 | level 3 | level 4 | level 5 | Cardinality | Datatype Name |
|---|---|---|---|---|---|---|---|
| | | | | Completer-InternalID 5730678 | | 0..1 5730680 | PartyInternalID 5730682 |
| | | | | Completer-Internal-Name 5730684 | | 0..1 5730686 | LONG_Name 5730688 |
| | | | | Completion DateTime 5730690 | | 0..1 5730692 | TIMEZONEINDEPENDENT_DateTime 5730694 |
| | | | | QualityIssueCategoryCatalogueID 5730696 | | 0..1 5730698 | QualityIssue-CategoryCatalogueID 5730700 |
| | | | | ParentQuality-IssueCategoryID 5730702 | | 0..1 5730704 | QualityIssue-CategoryID 5730706 |

FIG. 573-27

| Package | level 1 | level 2 | level 3 | level 4 | level 5 | Cardinality | Datatype Name |
|---|---|---|---|---|---|---|---|
| | | | | Par-entQuality-IssueCate-goryName 5730708 | | 0..1 5730710 | MEDIUM_Name 5730712 |
| | | | | QualityIs-sueCate-goryID 5730714 | | 0..1 5730716 | QualityIssue-CategoryID 5730718 |
| | | | | QualityIs-sueCate-goryName 5730720 | | 0..1 5730722 | MEDIUM_Name 5730724 |
| | | | | Description 5730726 | | 0..1 5730728 | SHORT_Descripti on 5730730 |
| | | | | Detailed-Text 5730732 | | 0..1 5730734 | Text 5730736 |

FIG. 573-28

| Package | level 1 | level 2 | level 3 | level 4 | level 5 | Cardinality | Datatype Name |
|---|---|---|---|---|---|---|---|
| | | | | Ordinal-Number-Value 5730738 | | 0..1 5730740 | OrdinalNumber-Value 5730742 |
| Activity 5730744 | | | Activitiy 5730746 | | | 0..n 5730748 | |
| | | | | ID 5730750 | | 1 5730752 | QualityIssueNoti-ficationActivityID 5730754 |
| | | | | Syste-mAdminis-trativeData 5730756 | | 1 5730758 | SystemAdminis-trativeData 5730760 |
| | | | | Process-ingPeriod 5730762 | | 0..1 5730764 | UPPEROPEN_TIMEZONEINDEPENDENT_DateTimePeriod 5730766 |

FIG. 573-29

| Package | level 1 | level 2 | level 3 | level 4 | level 5 | Cardinality | Datatype Name |
|---|---|---|---|---|---|---|---|
| | | | | QualityIssueCategoryCatalogueID 5730768 | | 0..1 5730770 | QualityIssueCategoryCatalogueID 5730772 |
| | | | | ParentQualityIssueCategoryID 5730774 | | 0..1 5730776 | QualityIssueCategoryID 5730778 |
| | | | | ParentQualityIssueCategoryName 5730780 | | 0..1 5730782 | MEDIUM_Name 5730784 |
| | | | | QualityIssueCategoryID 5730786 | | 0..1 5730788 | QualityIssueCategoryID 5730790 |

FIG. 573-30

| Package | level 1 | level 2 | level 3 | level 4 | level 5 | Cardinality | Datatype Name |
|---|---|---|---|---|---|---|---|
| | | | | QualityIs-sueCate-goryName 5730792 | | 0..1 5730794 | MEDIUM_Name 5730796 |
| | | | | Description 5730798 | | 0..1 5730800 | SHORT_Description 5730802 |
| | | | | Detailed-Text 5730804 | | 0..1 5730806 | Text 5730808 |
| | | | | Ordinal-Number-Value 5730810 | | 0..1 5730812 | OrdinalNumber-Value 5730814 |
| Party 5730816 | | | Party 5730818 | | | 0..n 5730820 | |
| BuyerParty 5730822 | | | | BuyerParty 5730824 | | 0..n 5730826 | |

FIG. 573-31

| Package | level 1 | level 2 | level 3 | level 4 | level 5 | Cardinality | Datatype Name |
|---|---|---|---|---|---|---|---|
| | | | | | InternalID 5730828 | 1 5730830 | PartyInternalID 5730832 |
| | | | | | Format-tedName 5730834 | 0..1 5730836 | LONG_Name 5730838 |
| VendorParty 5730840 | | | | Vendor-Party 5730842 | | 0..n 5730844 | |
| | | | | | InternalID 5730846 | 1 5730848 | PartyInternalID 5730850 |
| | | | | | Format-tedName 5730852 | 0..1 5730854 | LONG_Name 5730856 |
| EmployeeR-esponsi-bleParty 5730858 | | | | Employ-eeRespon-sibleParty 5730860 | | 0..n 5730862 | |
| | | | | | InternalID 5730864 | 1 5730866 | PartyInternalID 5730868 |

FIG. 573-32

| Package | level 1 | level 2 | level 3 | level 4 | level 5 | Cardinality | Datatype Name |
|---|---|---|---|---|---|---|---|
| | | | | | Format-tedName 5730870 | 0..1 5730872 | LONG_Name 5730874 |
| Party 5730876 | | | | Party 5730878 | | 0..n 5730880 | |
| | | | | | InternalID 5730882 | 1 5730884 | PartyInternalID 5730886 |
| | | | | | RoleCode 5730888 | 0..1 5730890 | PartyRoleCode 5730892 |
| | | | | | Format-tedName 5730894 | 0..1 5730896 | LONG_Name 5730898 |
| ProductInformation 5730900 | | | ProductIn-formation 5730902 | | | 0..1 5730904 | |
| Material 5730906 | | | | Material 5730908 | | 0..1 5730910 | |
| | | | | | InternalID 5730912 | 1 5730914 | ProductInternalID 5730916 |

FIG. 573-33

| Package | level 1 | level 2 | level 3 | level 4 | level 5 | Cardinality | Datatype Name |
|---|---|---|---|---|---|---|---|
| | | | | | Description 5730918 | 0..1 5730920 | SHORT_Description 5730922 |
| | | | | | PlantID 5730924 | 0..1 5730926 | PlantID 5730928 |
| | | | | | ProductComment 5730930 | 0..1 5730932 | LANGUAGEINDEPENDENT_Comment 5730934 |
| | | | | | BuyerID 5730936 | 0..1 5730938 | ProductPartyID 5730940 |
| | | | | | SellerID 5730942 | 0..1 5730944 | ProductPartyID 5730946 |
| | | | | | ManufacturerID 5730948 | 0..1 5730950 | ProductPartyID 5730952 |
| | | | | | BatchID 5730954 | 0..1 5730956 | BatchID 5730958 |
| | | | | | SerialID 5730960 | 0..1 5730962 | SerialID 5730964 |

FIG. 573-34

| Package | level 1 | level 2 | level 3 | level 4 | level 5 | Cardinality | Datatype Name |
|---|---|---|---|---|---|---|---|
| SalesOrderInformation 5730966 | | | SalesOrderInformation 5730968 | | | 0..1 5730970 | |
| SalesOrderInformation 5730972 | | | | SalesOrderInformation 5730974 | | 0..1 5730976 | |
| | | | | | ID 5730978 | 1 5730980 | SalesOrderID 5730982 |
| | | | | | ItemID 5730984 | 0..1 5730986 | SalesOrderItemID 5730988 |
| | | | | | BuyerID 5730990 | 0..1 5730992 | BusinessTransactionDocumentID 5730994 |
| | | | | | BuyerPurchaseDate 5730996 | 0..1 5730998 | Date 57301000 |

FIG. 573-35

| Package | level 1 | level 2 | level 3 | level 4 | level 5 | Cardinality | Datatype Name |
|---|---|---|---|---|---|---|---|
| BusinessTransactionDocumentReference 57301002 | | | BusinessTransactionDocumentReference 57301004 | | | 0..1 57301006 | |
| OutboundDeliveryReference 57301008 | | | | OutboundDeliveryReference 57301010 | | 0..1 57301012 | |
| | | | | | ID 57301014 | 1 57301016 | DeliveryID 57301018 |
| | | | | | ItemID 57301020 | 0..1 57301022 | DeliveryItemID 57301024 |
| PurchaseOrderReference 57301026 | | | | PurchaseOrderReference 57301028 | | 0..1 57301030 | |

FIG. 573-36

| Package | level 1 | level 2 | level 3 | level 4 | level 5 | Cardinality | Datatype Name |
|---|---|---|---|---|---|---|---|
| | | | | | ID 57301032 | 1 57301034 | PurchaseOrderID 57301036 |
| | | | | | ItemID 57301038 | 0..1 57301040 | PurchaseOrde-rItemID 57301042 |
| GoodsMove mentRefer-ence 57301044 | | | | GoodsMov emen-tReference 57301046 | | 0..1 57301048 | |
| | | | | | ID 57301050 | 1 57301052 | GoodsMovemen-tID 57301054 |
| | | | | | ItemID 57301056 | 0..1 57301058 | GoodsMovemen-tItemID 57301060 |
| | | | | | Year 57301062 | 0..1 57301064 | Year 57301066 |
| Produc-tionOrder-Reference 57301068 | | | | Produc-tionOrder-Reference 57301070 | | 0..1 57301072 | |

FIG. 573-37

| Package | level 1 | level 2 | level 3 | level 4 | level 5 | Cardinality | Datatype Name |
|---|---|---|---|---|---|---|---|
| | | | | | ID 57301074 | 1 57301076 | ProductionOrde-rID 57301078 |
| MaterialIn-spection-Reference 57301080 | | | | MaterialIn-spection-Reference 57301082 | | 0..n 57301084 | |
| | | | | | ID 57301086 | 1 57301088 | MaterialInspec-tionID 57301090 |
| QualityIs-sueNotifica-tionRefer-ence 57301092 | | | | QualityIs-sueNotifi-cation-Reference 57301094 | | 0..1 57301096 | |
| | | | | | ID 57301098 | 1 57301100 | QualityIssueNoti-ficationID 57301102 |
| Log 57301104 | | Log 57301106 | | | | 1 57301108 | Log 57301110 |

FIG. 574

| Package | level 1 | level 2 | level 3 | Cardinality | Datatype Name |
|---|---|---|---|---|---|
| QualityIssueNotification-ChangeConfirmation-Message_sync 574000 | QualityIssueNotificationChangeConfirmationMessage_sync 574002 | | | | QualityIssueNotification-ChangeConfirmation-Message_sync 574004 |
| Message-Header 574006 | | MessageHeader 574008 | | 0..1 574010 | BasicBusinessDocumentMessageHeader 574012 |
| QualityIssueNotification 574014 | | QualityIssueNotification 574016 | | 0..1 574018 | |
| | | | ID 574020 | 1 574022 | QualityIssueNotificationID 574024 |
| | | | StatusObject 574026 | 1 574028 | StatusObject 574030 |
| Log 574032 | | Log 574034 | | 1 574036 | Log 574038 |

FIG. 575-1

| Package | level 1 | level 2 | level 3 | level 4 | level 5 | Cardinality | Datatype Name |
|---|---|---|---|---|---|---|---|
| QualityIssueNotification-ChangeRequestMes-sage_sync 575000 | QualityIs-sueNotifica-tion-ChangeRe-questMes-sage_sync 575002 | | | | | | QualityIssueNotifica-tionChangeRequest-Message_sync 575004 |
| MessageHeader 575006 | | Message-Header 575008 | | | | 0..1 575010 | BasicBusinessDocu-mentMessageHeader 575012 |
| QualityIssueNotifica-tion 575014 | | QualityIs-sueNotifi-cation 575016 | | | | 1 575018 | |
| | | | ID 575020 | | | 1 575022 | QualityIssueNotifica-tionID 575024 |
| | | | External-QualityIs-sueNotifi-cation-Reference 575026 | | | 0..1 575028 | BusinessTransac-tionDocumentRefer-ence 575030 |

FIG. 575-2

| Package | level 1 | level 2 | level 3 | level 4 | level 5 | Cardinality | Datatype Name |
|---|---|---|---|---|---|---|---|
| | | | IssueQualityIssue-Cate-goryCata-logueID 575032 | | | 0..1 575034 | QualityIssueCate-goryCatalogueID 575036 |
| | | | IssuePar-entQuali-tyIssue-Cate-goryID 575038 | | | 0..1 575040 | QualityIssueCate-goryID 575042 |
| | | | IssueQualityIssue-Cate-goryID 575044 | | | 0..1 575046 | QualityIssueCate-goryID 575048 |
| | | | Reporter-InternalID 575050 | | | 0..1 575052 | PartyInternalID 575054 |

FIG. 575-3

| Package | level 1 | level 2 | level 3 | level 4 | level 5 | Cardinality | Datatype Name |
|---|---|---|---|---|---|---|---|
| | | | Report-edDateTime 575056 | | | 0..1 575058 | TIMEZONEINDEPENDENT_DateTime 575060 |
| | | | Request-edProc-essingPe-riod 575062 | | | 0..1 575064 | UPPEROPEN_TIMEZONEINDEPENDENT_DateTimePeriod 575066 |
| | | | Machin-eryBreak-downIndi-cator 575068 | | | 0..1 575070 | Indicator 575072 |
| | | | Machin-eryMal-function-Period 575074 | | | 0..1 575076 | UPPEROPEN_TIMEZONEINDEPENDENT_DateTimePeriod 575078 |
| | | | TypeCode 575080 | | | 1 575082 | QualityIssueNotifica-tionTypeCode 575084 |

FIG. 575-4

| Package | level 1 | level 2 | level 3 | level 4 | level 5 | Cardinality | Datatype Name |
|---|---|---|---|---|---|---|---|
| | | | Importance-Code 575086 | | | 0..1 575088 | ImportanceCode 575090 |
| | | | ComplaintQuantity 575092 | | | 0..1 575094 | Quantity 575096 |
| | | | ReferenceQuantity 575098 | | | 0..1 5750100 | Quantity 5750102 |
| | | | Internal-Nonconform-ingQuantity 5750104 | | | 0..1 5750106 | Quantity 5750108 |

FIG. 575-5

| Package | level 1 | level 2 | level 3 | level 4 | level 5 | Cardinality | Datatype Name |
|---|---|---|---|---|---|---|---|
| | | | External-Nonconform-ingQuantity 5750110 | | | 0..1 5750112 | Quantity 5750114 |
| | | | Return-edQuantity 5750116 | | | 0..1 5750118 | Quantity 5750120 |
| | | | Return-edDate 5750122 | | | 0..1 5750124 | Date 5750126 |
| | | | Description 5750128 | | | 0..1 5750130 | SHORT_Description 5750132 |
| | | | Detailed-Text 5750134 | | | 0..1 5750136 | Text 5750138 |
| Item 5750140 | | | Item 5750142 | | | 0..n 5750144 | |

FIG. 575-6

| Package | level 1 | level 2 | level 3 | level 4 | level 5 | Cardinality | Datatype Name |
|---|---|---|---|---|---|---|---|
| | | | | ID 5750146 | | 1 5750148 | QualityIssueNotificationItemID 5750150 |
| | | | | MaterialInternalID 5750152 | | 0..1 5750154 | ProductInternalID 5750156 |
| | | | | MaterialInspectionSampleID 5750158 | | 0..1 5750160 | MaterialInspectionSampleID 5750162 |
| | | | | DefectTypeQualityIssueCategoryCatalogueID 5750164 | | 0..1 5750166 | QualityIssueCategoryCatalogueID 5750168 |
| | | | | DefectTypeParentQualityIssueCategoryID 5750170 | | 0..1 5750172 | QualityIssueCategoryID 5750174 |

FIG. 575-7

| Package | level 1 | level 2 | level 3 | level 4 | level 5 | Cardinality | Datatype Name |
|---|---|---|---|---|---|---|---|
| | | | | DefectType-QualityIssueCategoryID 5750176 | | 0..1 5750178 | QualityIssueCategoryID 5750180 |
| | | | | DefectLocation-QualityIssueCategoryCatalogueID 5750182 | | 0..1 5750184 | QualityIssueCategoryCatalogueID 5750186 |
| | | | | DefectLocationParentQuality-IssueCategoryID 5750188 | | 0..1 5750190 | QualityIssueCategoryID 5750192 |

FIG. 575-8

| Package | level 1 | level 2 | level 3 | level 4 | level 5 | Cardinality | Datatype Name |
|---|---|---|---|---|---|---|---|
| | | | | DefectLocation-QualityIssueCategoryID 5750194 | | 0..1 5750196 | QualityIssueCategoryID 5750198 |
| | | | | Defect-Number-Value 5750200 | | 0..1 5750202 | NumberValue 5750204 |
| | | | | DefectClassCode 5750206 | | 0..1 5750208 | DefectClassCode 5750210 |
| | | | | Defect-WeightingClass-Code 5750212 | | 0..1 5750214 | DefectWeighting-ClassCode 5750216 |

FIG. 575-9

| Package | level 1 | level 2 | level 3 | level 4 | level 5 | Cardinality | Datatype Name |
|---|---|---|---|---|---|---|---|
| | | | | Internal-Noncon-form-ingQuantity 5750218 | | 0..1 5750220 | Quantity 5750222 |
| | | | | External-Noncon-form-ingQuantity 5750224 | | 0..1 5750226 | Quantity 5750228 |
| | | | | Description 5750230 | | 0..1 5750232 | SHORT_Description 5750234 |
| | | | | Detailed-Text 5750236 | | 0..1 5750238 | Text 5750240 |
| | | | | Ordinal-Number-Value 5750242 | | 0..1 5750244 | OrdinalNumberValue 5750246 |
| | | | | @actionCode 5750248 | | 0..1 5750250 | ActionCode 5750252 |

FIG. 575-10

| Package | level 1 | level 2 | level 3 | level 4 | level 5 | Cardinality | Datatype Name |
|---|---|---|---|---|---|---|---|
| Cause 5750254 | | | | Cause 5750256 | | 0..n 5750258 | |
| | | | | | QualityIssueNotification-CauseID 5750260 | 1 5750262 | QualityIssueNotificationCauseID 5750264 |
| | | | | | QualityIssueCategoryCatalogueID 5750266 | 0..1 5750268 | QualityIssueCategoryCatalogueID 5750270 |
| | | | | | ParentQualityIssueCategoryID 5750272 | 0..1 5750274 | QualityIssueCategoryID 5750276 |
| | | | | | QualityIssueCategoryID 5750278 | 0..1 5750280 | QualityIssueCategoryID 5750282 |

FIG. 575-11

| Package | level 1 | level 2 | level 3 | level 4 | level 5 | Cardinality | Datatype Name |
|---|---|---|---|---|---|---|---|
| | | | | | Description 5750284 | 0..1 5750286 | SHORT_Description 5750288 |
| | | | | | Detailed-Text 5750290 | 0..1 5750292 | Text 5750294 |
| | | | | | Ordinal-Number-Value 5750296 | 0..1 5750298 | OrdinalNumberValue 5750300 |
| | | | | | @actionCode 5750302 | 0..1 5750304 | ActionCode 5750306 |
| Task 5750308 | | | | Task 5750310 | | 0..n 5750312 | |
| | | | | | QualityIs-sueNotifi-cation-TaskID 5750314 | 1 5750316 | QualityIssueNotifica-tionTaskID 5750318 |

FIG. 575-12

| Package | level 1 | level 2 | level 3 | level 4 | level 5 | Cardinality | Datatype Name |
|---|---|---|---|---|---|---|---|
| | | | | | QualityIssueCategoryCatalogueID 5750320 | 0..1 5750322 | QualityIssueCategoryCatalogueID 5750324 |
| | | | | | ParentQualityIssueCategoryID 5750326 | 0..1 5750328 | QualityIssueCategoryID 5750330 |
| | | | | | QualityIssueCategoryID 5750332 | 0..1 5750334 | QualityIssueCategoryID 5750336 |
| | | | | | PlannedProcessingPeriod 5750338 | 0..1 5750340 | UPPEROPEN_TIMEZONEINDEPENDENT_DateTimePeriod 5750342 |
| | | | | | EmployeeResponsibleInternalID 5750344 | 0..1 5750346 | PartyInternalID 5750348 |

FIG. 575-13

| Package | level 1 | level 2 | level 3 | level 4 | level 5 | Cardinality | Datatype Name |
|---|---|---|---|---|---|---|---|
| | | | | | Employ-eeRespon-sibleInter-nalType-Code 5750350 | 0..1 5750352 | BusinessObjectType-Code 5750354 |
| | | | | | Completer-InternalID 5750356 | 0..1 5750358 | PartyInternalID 5750360 |
| | | | | | Completion DateTime 5750362 | 0..1 5750364 | TIMEZONEINDEPENDENT_DateTime 5750366 |
| | | | | | Description 5750368 | 0..1 5750370 | SHORT_Description 5750372 |
| | | | | | Detailed-Text 5750374 | 0..1 5750376 | Text 5750378 |
| | | | | | Ordinal-Number-Value 5750380 | 0..1 5750382 | OrdinalNumberValue 5750384 |

FIG. 575-14

| Package | level 1 | level 2 | level 3 | level 4 | level 5 | Cardinality | Datatype Name |
|---|---|---|---|---|---|---|---|
| | | | | | @actionCode 5750386 | 0..1 5750388 | ActionCode 5750390 |
| Activity 5750392 | | | | Activity 5750394 | | 0..n 5750396 | |
| | | | | | QualityIssueNotificationActivityID 5750398 | 1 5750400 | QualityIssueNotificationActivityID 5750402 |
| | | | | | QualityIssueCategoryCatalogueID 5750404 | 0..1 5750406 | QualityIssueCategoryCatalogueID 5750408 |
| | | | | | ParentQualityIssueCategoryID 5750410 | 0..1 5750412 | QualityIssueCategoryID 5750414 |

FIG. 575-15

| Package | level 1 | level 2 | level 3 | level 4 | level 5 | Cardinality | Datatype Name |
|---|---|---|---|---|---|---|---|
| | | | | | QualityIssueCategoryID 5750416 | 0..1 5750418 | QualityIssueCategoryID 5750420 |
| | | | | | ProcessingPeriod 5750422 | 0..1 5750424 | UPPEROPEN_TIMEZONEINDEPENDENT_DateTimePeriod 5750426 |
| | | | | | Description 5750428 | 0..1 5750430 | SHORT_Description 5750432 |
| | | | | | DetailedText 5750434 | 0..1 5750436 | Text 5750438 |
| | | | | | OrdinalNumberValue 5750440 | 0..1 5750442 | OrdinalNumberValue 5750444 |
| | | | | | @actionCode 5750446 | 0..1 5750448 | ActionCode 5750450 |

FIG. 575-16

| Package | level 1 | level 2 | level 3 | level 4 | level 5 | Cardinality | Datatype Name |
|---|---|---|---|---|---|---|---|
| Task 5750452 | | | Task 5750454 | | | 0..n 5750456 | |
| | | | | ID 5750458 | | 1 5750460 | QualityIssueNotificationTaskID 5750462 |
| | | | | QualityIssueCategoryCatalogueID 5750464 | | 0..1 5750466 | QualityIssueCategoryCatalogueID 5750468 |
| | | | | ParentQualityIssueCategoryID 5750470 | | 0..1 5750472 | QualityIssueCategoryID 5750474 |
| | | | | QualityIssueCategoryID 5750476 | | 0..1 5750478 | QualityIssueCategoryID 5750480 |

FIG. 575-17

| Package | level 1 | level 2 | level 3 | level 4 | level 5 | Cardinality | Datatype Name |
|---|---|---|---|---|---|---|---|
| | | | | Planned-Process-ingPeriod 5750482 | | 0..1 5750484 | UPPEROPEN_TIMEZONEINDEPENDENT_DateTimePeriod 5750486 |
| | | | | Employ-eeRespon-sibleInter-nalID 5750488 | | 0..1 5750490 | PartyInternalID 5750492 |
| | | | | Employ-eeRespon-sibleInter-nalType-Code 5750494 | | 0..1 5750496 | BusinessObjectType-Code 5750498 |
| | | | | Completer-InternalID 5750500 | | 0..1 5750502 | PartyInternalID 5750504 |
| | | | | Completion DateTime 5750506 | | 0..1 5750508 | TIMEZONEINDEPENDENT_DateTime 5750510 |

FIG. 575-18

| Package | level 1 | level 2 | level 3 | level 4 | level 5 | Cardinality | Datatype Name |
|---|---|---|---|---|---|---|---|
| | | | | Description 5750512 | | 0..1 5750514 | SHORT_Description 5750516 |
| | | | | Detailed-Text 5750518 | | 0..1 5750520 | Text 5750522 |
| | | | | Ordinal-Number-Value 5750524 | | 0..1 5750526 | OrdinalNumberValue 5750528 |
| | | | | @actionCode 5750530 | | 0..1 5750532 | ActionCode 5750534 |
| Activity 5750536 | | | Activitiy 5750538 | | | 0..n 5750540 | |
| | | | | ID 5750542 | | 1 5750544 | QualityIssueNotificationActivityID 5750546 |

FIG. 575-19

| Package | level 1 | level 2 | level 3 | level 4 | level 5 | Cardinality | Datatype Name |
|---|---|---|---|---|---|---|---|
| | | | | QualityIssueCategoryCatalogueID 5750548 | | 0..1 5750550 | QualityIssueCategoryCatalogueID 5750552 |
| | | | | ParentQualityIssueCategoryID 5750554 | | 0..1 5750556 | QualityIssueCategoryID 5750558 |
| | | | | QualityIssueCategoryID 5750560 | | 0..1 5750562 | QualityIssueCategoryID 5750564 |
| | | | | ProcessingPeriod 5750566 | | 0..1 5750568 | UPPEROPEN_TIMEZONEINDEPENDENT_DateTimePeriod 5750570 |
| | | | | Description 5750572 | | 0..1 5750574 | SHORT_Description 5750576 |

FIG. 575-20

| Package | level 1 | level 2 | level 3 | level 4 | level 5 | Cardinality | Datatype Name |
|---|---|---|---|---|---|---|---|
| | | | | Detailed-Text 5750578 | | 0..1 5750580 | Text 5750582 |
| | | | | Ordinal-Number-Value 5750584 | | 0..1 5750586 | OrdinalNumberValue 5750588 |
| | | | | @actionCode 5750590 | | 0..1 5750592 | ActionCode 5750594 |
| Party 5750596 | | | Party 5750598 | | | 0..n 5750600 | |
| BuyerParty 5750602 | | | | BuyerParty 5750604 | | 0..n 5750606 | |
| | | | | | InternalID 5750608 | 0..1 5750610 | PartyInternalID 5750612 |
| VendorParty 5750614 | | | | Vendor-Party 5750616 | | 0..n 5750618 | |

FIG. 575-21

| Package | level 1 | level 2 | level 3 | level 4 | level 5 | Cardinality | Datatype Name |
|---|---|---|---|---|---|---|---|
| | | | | | InternalID 5750620 | 0..1 5750622 | PartyInternalID 5750624 |
| EmployeeResponsibleParty 5750626 | | | | EmployeeResponsibleParty 5750628 | | 0..n 5750630 | |
| | | | | | InternalID 5750632 | 0..1 5750634 | PartyInternalID 5750636 |
| Party 5750638 | | | | Party 5750640 | | 0..n 5750642 | |
| | | | | | InternalID 5750644 | 0..1 5750646 | PartyInternalID 5750648 |
| | | | | | RoleCode 5750650 | 0..1 5750652 | PartyRoleCode 5750654 |
| ProductInformation 5750656 | | | ProductInformation 5750658 | | | 0..1 5750660 | |

FIG. 575-22

| Package | level 1 | level 2 | level 3 | level 4 | level 5 | Cardinality | Datatype Name |
|---|---|---|---|---|---|---|---|
| Material 5750662 | | | | Material 5750664 | | 0..1 5750666 | |
| | | | | | InternalID 5750668 | 0..1 5750670 | ProductInternalID 5750672 |
| | | | | | PlantID 5750674 | 0..1 5750676 | PlantID 5750678 |
| | | | | | Pro-ductCom-ment 5750680 | 0..1 5750682 | LANGUAGEINDEPENDENT_Comment 5750684 |
| | | | | | BuyerID 5750686 | 0..1 5750688 | ProductPartyID 5750690 |
| | | | | | SellerID 5750692 | 0..1 5750694 | ProductPartyID 5750696 |
| | | | | | Manufac-turerID 5750698 | 0..1 5750700 | ProductPartyID 5750702 |

FIG. 575-23

| Package | level 1 | level 2 | level 3 | level 4 | level 5 | Cardinality | Datatype Name |
|---|---|---|---|---|---|---|---|
| | | | | | BatchID 5750704 | 0..1 5750706 | BatchID 5750708 |
| | | | | | SerialID 5750710 | 0..1 5750712 | SerialID 5750714 |
| SalesOrderInformation 5750716 | | | SalesOrderInformation 5750718 | | | 0..1 5750720 | |
| SalesOrderInformation 5750722 | | | | SalesOrderInformation 5750724 | | 0..1 5750726 | |
| | | | | | ID 5750728 | 0..1 5750730 | SalesOrderID 5750732 |
| | | | | | ItemID 5750734 | 0..1 5750736 | SalesOrderItemID 5750738 |

FIG. 575-24

| Package | level 1 | level 2 | level 3 | level 4 | level 5 | Cardinality | Datatype Name |
|---|---|---|---|---|---|---|---|
| | | | | | BuyerID 5750740 | 0..1 5750742 | BusinessTransactionDocumentID 5750744 |
| | | | | | BuyerPurchaseDate 5750746 | 0..1 5750748 | Date 5750750 |
| BusinessTransactionDocumentReference 5750752 | | | Business-Transaction-DocumentReference 5750754 | | | 0..1 5750756 | |
| OutboundDeliveryReference 5750758 | | | | OutboundDeliveryReference 5750760 | | 0..1 5750762 | |
| | | | | | ID 5750764 | 0..1 5750766 | DeliveryID 5750768 |

FIG. 575-25

| Package | level 1 | level 2 | level 3 | level 4 | level 5 | Cardinality | Datatype Name |
|---|---|---|---|---|---|---|---|
| | | | | | ItemID 5750770 | 0..1 5750772 | DeliveryItemID 5750774 |
| PurchaseOrderReference 5750776 | | | | PurchaseOrderReference 5750778 | | 0..1 5750780 | |
| | | | | | ID 5750782 | 0..1 5750784 | PurchaseOrderID 5750786 |
| | | | | | ItemID 5750788 | 0..1 5750790 | PurchaseOrderItemID 5750792 |
| GoodsMovementReference 5750794 | | | | GoodsMovementReference 5750796 | | 0..1 5750798 | |
| | | | | | ID 5750800 | 0..1 5750802 | GoodsMovementID 5750804 |

FIG. 575-26

| Package | level 1 | level 2 | level 3 | level 4 | level 5 | Cardinality | Datatype Name |
|---|---|---|---|---|---|---|---|
| | | | | | ItemID 5750806 | 0..1 5750808 | GoodsMovementItemID 5750810 |
| | | | | | Year 5750812 | 0..1 5750814 | Year 5750816 |
| ProductionOrderReference 5750818 | | | | ProductionOrderReference 5750820 | | 0..1 5750822 | |
| | | | | | ID 5750824 | 0..1 5750826 | ProductionOrderID 5750828 |
| MaterialInspectionReference 5750830 | | | | MaterialInspectionReference 5750832 | | 0..1 5750834 | |
| | | | | | ID 5750836 | 0..1 5750838 | MaterialInspectionID 5750840 |

FIG. 575-27

| Package | level 1 | level 2 | level 3 | level 4 | level 5 | Cardinality | Datatype Name |
|---|---|---|---|---|---|---|---|
| QualityIssueNotificationReference 5750842 | | | | QualityIssueNotification-Reference 5750844 | | 0..1 5750846 | |
| | | | | | ID 5750848 | 0..1 5750850 | QualityIssueNotificationID 5750852 |

FIG. 576

| Package | level 1 | level 2 | level 3 | Cardinality | Datatype Name |
|---|---|---|---|---|---|
| QualityIssueNotification-CreateConfirmationMessage_sync 576000 | QualityIssueNotificationCreate-Confirmation-Message_sync 576002 | | | | QualityIssueNotification-CreateConfirmationMessage_sync 576004 |
| MessageHeader 576006 | | MessageHeader 576008 | | 0..1 576010 | BasicBusinessDocument-MessageHeader 576012 |
| QualityIssueNotification 576014 | | QualityIssueNotification 576016 | | 0..1 576018 | |
| | | | ID 576020 | 1 576022 | QualityIssueNotificationID 576024 |
| | | | StatusObject 576026 | 1 576028 | StatusObject 576030 |
| Log 576032 | | Log 576034 | | 1 576036 | Log 576038 |

FIG. 577-1

| Package | level 1 | level 2 | level 3 | level 4 | level 5 | Cardinality | Datatype Name |
|---|---|---|---|---|---|---|---|
| QualityIssueNotificationCreateRequestMessage_sync 577000 | QualityIssueNotificationCreateRequestMessage_sync 577002 | | | | | | QualityIssueNotificationCreateRequestMessage_sync 577004 |
| MessageHeader 577006 | | MessageHeader 577008 | | | | 0..1 577010 | BasicBusinessDocumentMessageHeader 577012 |
| QualityIssueNotification 577014 | | QualityIssueNotification 577016 | | | | 1 577018 | |
| | | | ID 577020 | | | 0..1 577022 | QualityIssueNotificationID 577024 |

FIG. 577-2

| Package | level 1 | level 2 | level 3 | level 4 | level 5 | Cardinality | Datatype Name |
|---|---|---|---|---|---|---|---|
| | | | External-QualityIssueNotification-Reference 577026 | | | 0..1 577028 | BusinessTransaction-DocumentReference 577030 |
| | | | IssueQualityIssue-Category-CatalogueID 577032 | | | 0..1 577034 | QualityIssueCategory-CatalogueID 577036 |
| | | | IssueParentQuality-IssueCategoryID 577038 | | | 0..1 577040 | QualityIssueCategoryID 577042 |
| | | | IssueQualityIssue-CategoryID 577044 | | | 0..1 577046 | QualityIssueCategoryID 577048 |

FIG. 577-3

| Package | level 1 | level 2 | level 3 | level 4 | level 5 | Cardinality | Datatype Name |
|---|---|---|---|---|---|---|---|
| | | | Reporter-InternalID 577050 | | | 0..1 577052 | PartyInternalID 577054 |
| | | | Reported-DateTime 577056 | | | 0..1 577058 | TIMEZONEINDEPENDENT_DateTime 577060 |
| | | | Request-edProcess-ingPeriod 577062 | | | 0..1 577064 | UPPEROPEN_TIMEZONEINDEPENDENT_DateTimePeriod 577066 |
| | | | Machin-eryBreak-downIndi-cator 577068 | | | 0..1 577070 | Indicator 577072 |
| | | | Machin-eryMal-functionPe-riod 577074 | | | 0..1 577076 | UPPEROPEN_TIMEZONEINDEPENDENT_DateTimePeriod 577078 |

FIG. 577-4

| Package | level 1 | level 2 | level 3 | level 4 | level 5 | Cardinality | Datatype Name |
|---|---|---|---|---|---|---|---|
| | | | TypeCode 577080 | | | 1 577082 | QualityIssueNotification-TypeCode 577084 |
| | | | Impor-tanceCode 577086 | | | 0..1 577088 | ImportanceCode 577090 |
| | | | Com-plaintQuan tity 577092 | | | 0..1 577094 | Quantity 577096 |
| | | | Refer-enceQuan-tity 577098 | | | 0..1 5770100 | Quantity 5770102 |
| | | | Internal-Noncon-form-ingQuantity 5770104 | | | 0..1 5770106 | Quantity 5770108 |

FIG. 577-5

| Package | level 1 | level 2 | level 3 | level 4 | level 5 | Cardinality | Datatype Name |
|---|---|---|---|---|---|---|---|
| | | | External-Noncon-form-ingQuantity 5770110 | | | 0..1 5770112 | Quantity 5770114 |
| | | | Returned-Quantity 5770116 | | | 0..1 5770118 | Quantity 5770120 |
| | | | Returned-Date 5770122 | | | 0..1 5770124 | Date 5770126 |
| | | | Description 5770128 | | | 0..1 5770130 | SHORT_Description 5770132 |
| | | | Detailed-Text 5770134 | | | 0..1 5770136 | Text 5770138 |
| Item 5770140 | | | Item 5770142 | | | 0..n 5770144 | |

FIG. 577-6

| Package | level 1 | level 2 | level 3 | level 4 | level 5 | Cardinality | Datatype Name |
|---|---|---|---|---|---|---|---|
| | | | | MaterialInternalID 5770146 | | 0..1 5770148 | ProductInternalID 5770150 |
| | | | | MaterialInspectionSampleID 5770152 | | 0..1 5770154 | MaterialInspectionSampleID 5770156 |
| | | | | DefectTypeQualityIssueCategoryCatalogueID 5770158 | | 0..1 5770160 | QualityIssueCategoryCatalogueID 5770162 |
| | | | | DefectTypeParentQualityIssueCategoryID 5770164 | | 0..1 5770166 | QualityIssueCategoryID 5770168 |

FIG. 577-7

| Package | level 1 | level 2 | level 3 | level 4 | level 5 | Cardinality | Datatype Name |
|---|---|---|---|---|---|---|---|
| | | | | DefectTypeQualityIssueCategoryID 5770170 | | 0..1 5770172 | QualityIssueCategoryID 5770174 |
| | | | | DefectLocationQualityIssueCategoryCatalogueID 5770176 | | 0..1 5770178 | QualityIssueCategoryCatalogueID 5770180 |
| | | | | DefectLocationParentQualityIssueCategoryID 5770182 | | 0..1 5770184 | QualityIssueCategoryID 5770186 |

FIG. 577-8

| Package | level 1 | level 2 | level 3 | level 4 | level 5 | Cardinality | Datatype Name |
|---|---|---|---|---|---|---|---|
| | | | | DefectLocation-QualityIssueCategoryID 5770188 | | 0..1 5770190 | QualityIssueCategoryID 5770192 |
| | | | | Defect-Number-Value 5770194 | | 0..1 5770196 | NumberValue 5770198 |
| | | | | DefectClass-Code 5770200 | | 0..1 5770202 | DefectClassCode 5770204 |
| | | | | Defect-WeightingClass-Code 5770206 | | 0..1 5770208 | DefectWeightingClass-Code 5770210 |

FIG. 577-9

| Package | level 1 | level 2 | level 3 | level 4 | level 5 | Cardinality | Datatype Name |
|---|---|---|---|---|---|---|---|
| | | | | Internal-Noncon-form-ingQuantity 5770212 | | 0..1 5770214 | Quantity 5770216 |
| | | | | External-Noncon-form-ingQuantity 5770218 | | 0..1 5770220 | Quantity 5770222 |
| | | | | Description 5770224 | | 0..1 5770226 | SHORT_Description 5770228 |
| | | | | Detailed-Text 5770230 | | 0..1 5770232 | Text 5770234 |
| | | | | Ordinal-Number-Value 5770236 | | 0..1 5770238 | OrdinalNumberValue 5770240 |
| Cause 5770242 | | | | Cause 5770244 | | 0..n 5770246 | |

FIG. 577-10

| Package | level 1 | level 2 | level 3 | level 4 | level 5 | Cardinality | Datatype Name |
|---|---|---|---|---|---|---|---|
| | | | | | QualityIs-sueCate-goryCata-logueID 5770248 | 0..1 5770250 | QualityIssueCategory-CatalogueID 5770252 |
| | | | | | Par-entQuality-IssueCate-goryID 5770254 | 0..1 5770256 | QualityIssueCategoryID 5770258 |
| | | | | | QualityIs-sueCate-goryID 5770260 | 0..1 5770262 | QualityIssueCategoryID 5770264 |
| | | | | | Description 5770266 | 0..1 5770268 | SHORT_Description 5770270 |
| | | | | | Detailed-Text 5770272 | 0..1 5770274 | Text 5770276 |

FIG. 577-11

| Package | level 1 | level 2 | level 3 | level 4 | level 5 | Cardinality | Datatype Name |
|---|---|---|---|---|---|---|---|
| | | | | | Ordinal-Number-Value 5770278 | 0..1 5770280 | OrdinalNumberValue 5770282 |
| Task 5770284 | | | | Task 5770286 | | 0..n 5770288 | |
| | | | | | QualityIs-sueCate-goryCata-logueID 5770290 | 0..1 5770292 | QualityIssueCategory-CatalogueID 5770294 |
| | | | | | Par-entQuality-IssueCate-goryID 5770296 | 0..1 5770298 | QualityIssueCategoryID 5770300 |
| | | | | | QualityIs-sueCate-goryID 5770302 | 0..1 5770304 | QualityIssueCategoryID 5770306 |

FIG. 577-12

| Package | level 1 | level 2 | level 3 | level 4 | level 5 | Cardinality | Datatype Name |
|---|---|---|---|---|---|---|---|
| | | | | | Planned-Process-ingPeriod 5770308 | 0..1 5770310 | UPPEROPEN_TIMEZONEINDEPENDENT_DateTimePeriod 5770312 |
| | | | | | Employ-eeRespon-sibleInter-nalID 5770314 | 0..1 5770316 | PartyInternalID 5770318 |
| | | | | | Employ-eeRespon-sibleInter-nalType-Code 5770320 | 0..1 5770322 | BusinessObjectType-Code 5770324 |
| | | | | | Completer-InternalID 5770326 | 0..1 5770328 | PartyInternalID 5770330 |
| | | | | | Completion DateTime 5770332 | 0..1 5770334 | TIMEZONEINDEPENDENT_DateTime 5770336 |

FIG. 577-13

| Package | level 1 | level 2 | level 3 | level 4 | level 5 | Cardinality | Datatype Name |
|---|---|---|---|---|---|---|---|
| | | | | | Description 5770338 | 0..1 5770340 | SHORT_Description 5770342 |
| | | | | | Detailed-Text 5770344 | 0..1 5770346 | Text 5770348 |
| | | | | | Ordinal-Number-Value 5770350 | 0..1 5770352 | OrdinalNumberValue 5770354 |
| Activity 5770356 | | | | Activity 5770358 | | 0..n 5770360 | |
| | | | | | QualityIs-sueCate-goryCata-logueID 5770362 | 0..1 5770364 | QualityIssueCategory-CatalogueID 5770366 |
| | | | | | Par-entQuality-IssueCate-goryID 5770368 | 0..1 5770370 | QualityIssueCategoryID 5770372 |

FIG. 577-14

| Package | level 1 | level 2 | level 3 | level 4 | level 5 | Cardinality | Datatype Name |
|---|---|---|---|---|---|---|---|
| | | | | | QualityIs-sueCate-goryID 5770374 | 0..1 5770376 | QualityIssueCategoryID 5770378 |
| | | | | | Process-ingPeriod 5770380 | 0..1 5770382 | UPPEROPEN_TIMEZONEINDEPENDENT_DateTimePeriod 5770384 |
| | | | | | Description 5770386 | 0..1 5770388 | SHORT_Description 5770390 |
| | | | | | Detailed-Text 5770392 | 0..1 5770394 | Text 5770396 |
| | | | | | Ordinal-Number-Value 5770398 | 0..1 5770400 | OrdinalNumberValue 5770402 |
| Task 5770404 | | | Task 5770406 | | | 0..n 5770408 | |

FIG. 577-15

| Package | level 1 | level 2 | level 3 | level 4 | level 5 | Cardinality | Datatype Name |
|---|---|---|---|---|---|---|---|
| | | | | QualityIssueCategoryCatalogueID 5770410 | | 0..1 5770412 | QualityIssueCategory-CatalogueID 5770414 |
| | | | | ParentQualityIssueCategoryID 5770416 | | 0..1 5770418 | QualityIssueCategoryID 5770420 |
| | | | | QualityIssueCategoryID 5770422 | | 0..1 5770424 | QualityIssueCategoryID 5770426 |
| | | | | PlannedProcessingPeriod 5770428 | | 0..1 5770430 | UPPEROPEN_TIMEZONEINDEPENDENT_DateTimePeriod 5770432 |
| | | | | EmployeeResponsibleInternalID 5770434 | | 0..1 5770436 | PartyInternalID 5770438 |

FIG. 577-16

| Package | level 1 | level 2 | level 3 | level 4 | level 5 | Cardinality | Datatype Name |
|---|---|---|---|---|---|---|---|
| | | | | Employ-eeRespon-sibleInter-nalType-Code 5770440 | | 0..1 5770442 | BusinessObjectType-Code 5770444 |
| | | | | Completer-InternalID 5770446 | | 0..1 5770448 | PartyInternalID 5770450 |
| | | | | Completion DateTime 5770452 | | 0..1 5770454 | TIMEZONEINDEPENDENT_DateTime 5770456 |
| | | | | Description 5770458 | | 0..1 5770460 | SHORT_Description 5770462 |
| | | | | Detailed-Text 5770464 | | 0..1 5770466 | Text 5770468 |
| | | | | Ordinal-Number-Value 5770470 | | 0..1 5770472 | OrdinalNumberValue 5770474 |

FIG. 577-17

| Package | level 1 | level 2 | level 3 | level 4 | level 5 | Cardinality | Datatype Name |
|---|---|---|---|---|---|---|---|
| Activity 5770476 | | | Activitiy 5770478 | | | 0..n 5770480 | |
| | | | | QualityIssueCategoryCatalogueID 5770482 | | 0..1 5770484 | QualityIssueCategory-CatalogueID 5770486 |
| | | | | ParentQualityIssueCategoryID 5770488 | | 0..1 5770490 | QualityIssueCategoryID 5770492 |
| | | | | QualityIssueCategoryID 5770494 | | 0..1 5770496 | QualityIssueCategoryID 5770498 |
| | | | | ProcessingPeriod 5770500 | | 0..1 5770502 | UPPEROPEN_TIMEZONEINDEPENDENT_DateTimePeriod 5770504 |
| | | | | Description 5770506 | | 0..1 5770508 | SHORT_Description 5770510 |

FIG. 577-18

| Package | level 1 | level 2 | level 3 | level 4 | level 5 | Cardinality | Datatype Name |
|---|---|---|---|---|---|---|---|
| | | | | Detailed-Text 5770512 | | 0..1 5770514 | Text 5770516 |
| | | | | Ordinal-Number-Value 5770518 | | 0..1 5770520 | OrdinalNumberValue 5770522 |
| Party 5770524 | | | Party 5770526 | | | 0..n 5770528 | |
| BuyerParty 5770530 | | | | BuyerParty 5770532 | | 0..n 5770534 | |
| | | | | | InternalID 5770536 | 0..1 5770538 | PartyInternalID 5770540 |
| Vendor-Party 5770542 | | | | Vendor-Party 5770544 | | 0..n 5770546 | |
| | | | | | InternalID 5770548 | 0..1 5770550 | PartyInternalID 5770552 |

FIG. 577-19

| Package | level 1 | level 2 | level 3 | level 4 | level 5 | Cardinality | Datatype Name |
|---|---|---|---|---|---|---|---|
| EmployeeResponsibleParty 5770554 | | | | EmployeeResponsibleParty 5770556 | | 0..n 5770558 | |
| | | | | | InternalID 5770560 | 0..1 5770562 | PartyInternalID 5770564 |
| Party 5770566 | | | | Party 5770568 | | 0..n 5770570 | |
| | | | | | InternalID 5770572 | 0..1 5770574 | PartyInternalID 5770576 |
| | | | | | RoleCode 5770578 | 0..1 5770580 | PartyRoleCode 5770582 |
| ProductInformation 5770584 | | | ProductInformation 5770586 | | | 0..1 5770588 | |
| Material 5770590 | | | | Material 5770592 | | 0..1 5770594 | |
| | | | | | InternalID 5770596 | 0..1 5770598 | ProductInternalID 5770600 |

FIG. 577-20

| Package | level 1 | level 2 | level 3 | level 4 | level 5 | Cardinality | Datatype Name |
|---|---|---|---|---|---|---|---|
| | | | | | PlantID 5770602 | 0..1 5770604 | PlantID 5770606 |
| | | | | | ProductComment 5770608 | 0..1 5770610 | LANGUAGEINDEPENDENT_Comment 5770612 |
| | | | | | BuyerID 5770614 | 0..1 5770616 | ProductPartyID 5770618 |
| | | | | | SellerID 5770620 | 0..1 5770622 | ProductPartyID 5770624 |
| | | | | | ManufacturerID 5770626 | 0..1 5770628 | ProductPartyID 5770630 |
| | | | | | BatchID 5770632 | 0..1 5770634 | BatchID 5770636 |
| | | | | | SerialID 5770638 | 0..1 5770640 | SerialID 5770642 |
| SalesOrderInformation 5770644 | | | SalesOrderInformation 5770646 | | | 0..1 5770648 | |

FIG. 577-21

| Package | level 1 | level 2 | level 3 | level 4 | level 5 | Cardinality | Datatype Name |
|---|---|---|---|---|---|---|---|
| SalesOrderInformation 5770650 | | | | SalesOrderInformation 5770652 | | 0..1 5770654 | |
| | | | | | ID 5770656 | 0..1 5770658 | SalesOrderID 5770660 |
| | | | | | ItemID 5770662 | 0..1 5770664 | SalesOrderItemID 5770666 |
| | | | | | BuyerID 5770668 | 0..1 5770670 | BusinessTransactionDocumentID 5770672 |
| | | | | | BuyerPurchaseDate 5770674 | 0..1 5770676 | Date 5770678 |
| BusinessTransactionDocumentReference 5770680 | | | BusinessTransactionDocumentReference 5770682 | | | 0..1 5770684 | |

FIG. 577-22

| Package | level 1 | level 2 | level 3 | level 4 | level 5 | Cardinality | Datatype Name |
|---|---|---|---|---|---|---|---|
| Out-boundDeliveryRefer-ence 5770686 | | | | Out-boundDeliveryRefer-ence 5770688 | | 0..1 5770690 | |
| | | | | | ID 5770692 | 0..1 5770694 | DeliveryID 5770696 |
| | | | | | ItemID 5770698 | 0..1 5770700 | DeliveryItemID 5770702 |
| Pur-chaseOr-derRefer-ence 5770704 | | | | Pur-chaseOr-derRefer-ence 5770706 | | 0..1 5770708 | |
| | | | | | ID 5770710 | 0..1 5770712 | PurchaseOrderID 5770714 |
| | | | | | ItemID 5770716 | 0..1 5770718 | PurchaseOrderItemID 5770720 |

FIG. 577-23

| Package | level 1 | level 2 | level 3 | level 4 | level 5 | Cardinality | Datatype Name |
|---|---|---|---|---|---|---|---|
| GoodsMovementReference 5770722 | | | | GoodsMovementReference 5770724 | | 0..1 5770726 | |
| | | | | | ID 5770728 | 0..1 5770730 | GoodsMovementID 5770732 |
| | | | | | ItemID 5770734 | 0..1 5770736 | GoodsMovementItemID 5770738 |
| | | | | | Year 5770740 | 0..1 5770742 | Year 5770744 |
| ProductionOrderReference 5770746 | | | | ProductionOrderReference 5770748 | | 0..1 5770750 | |
| | | | | | ID 5770752 | 0..1 5770754 | ProductionOrderID 5770756 |
| MaterialInspectionReference 5770758 | | | | MaterialInspectionReference 5770760 | | 0..1 5770762 | |

FIG. 577-24

| Package | level 1 | level 2 | level 3 | level 4 | level 5 | Cardinality | Datatype Name |
|---|---|---|---|---|---|---|---|
| | | | | | ID 5770764 | 0..1 5770766 | MaterialInspectionID 5770768 |
| QualityIssueNotification-Reference 5770770 | | | | QualityIssueNotification-Reference 5770772 | | 0..1 5770774 | |
| | | | | | ID 5770776 | 0..1 5770778 | QualityIssueNotificationID 5770780 |

FIG. 578-1

| Package | level 1 | level 2 | level 3 | level 4 | Cardinality | Datatype Name |
|---|---|---|---|---|---|---|
| QualityIssueNotificationProductByElementsQueryMessage_sync 578000 | QualityIssueNotificationProductByElementsQueryMessage_sync 578002 | | | | | QualityIssueNotificationProductByElementsQueryMessage_sync 578004 |
| Selection 578006 | | QualityIssueNotificationSimpleSelectionByElements 578008 | | | 1 578010 | |
| | | | TypeCode 578012 | | 0..1 578014 | QualityIssueNotificationTypeCode 578016 |
| | | | RequestedProcessingPeriod 578018 | | 0..1 578020 | UPPEROPEN_TIMEZONEINDEPENDENT_DateTimePeriod 578022 |
| | | | SelectionByMaterialInternalID 578024 | | 0..n 578026 | SelectionByMaterialInternalID 578028 |

FIG. 578-2

| Package | level 1 | level 2 | level 3 | level 4 | Cardinality | Datatype Name |
|---|---|---|---|---|---|---|
| | | | | InclusionExclusionCode 578030 | 0..1 578032 | InclusionExclusionCode 578034 |
| | | | | IntervalBoundaryTypeCode 578036 | 1 578038 | IntervalBoundaryTypeCode 578040 |
| | | | | LowerBoundaryMaterialInternalID 578042 | 0..1 578044 | ProductInternalID 578046 |
| | | | | UpperBoundaryMaterialInternalID 578048 | 0..1 578050 | ProductInternalID 578052 |
| | | | BuyerPartyInternalID 578054 | | 0..1 578056 | PartyInternalID 578058 |
| | | | VendorParty-InternalID 578060 | | 0..1 578062 | PartyInternalID 578064 |

FIG. 578-3

| Package | level 1 | level 2 | level 3 | level 4 | Cardinality | Datatype Name |
|---|---|---|---|---|---|---|
| | | | ReleaseStatus-Code 578066 | | 1 578068 | NOTRELEASED RELEASED_ReleaseStatusCode 578070 |
| | | | ClosureStatus-Code 578072 | | 1 578074 | ClosureStatus-Code 578076 |
| Process-ingCondi-tions 578078 | | ProcessingCondi-tions 578080 | | | 1 578082 | |
| | | | QueryHitsMaxi-mumNumber-Value 578084 | | 0..1 578086 | NumberValue 578088 |
| | | | UnlimitedQuery-HitsIndicator 578090 | | 0..1 578092 | Indicator 578094 |

FIG. 579-1

| Package | level 1 | level 2 | level 3 | level 4 | level 5 | Cardinality | Datatype Name |
|---|---|---|---|---|---|---|---|
| QualityIssueNotification-ProductByElementsRe-sponseMessage_sync 579000 | QualityIs-sueNotifi-cationPro-ductByE-lements-Respon-seMes-sage_sync 579002 | | | | | | QualityIssueNoti-ficationPro-ductByElements-ResponseMes-sage_sync 579004 |
| QualityIssueNotifica-tion 579006 | | QualityIs-sueNotifi-cation 579008 | | | | 0..n 579010 | |
| | | | ID 579012 | | | 1 579014 | QualityIssueNoti-ficationID 579016 |
| | | | StatusOb-ject 579018 | | | 1 579020 | StatusObject 579022 |
| | | | Request-edProcess-ingPeriod 579024 | | | 0..1 579026 | UPPEROPEN_TI MEZONEINDEPE NDENT_DateTim ePeriod 579028 |

FIG. 579-2

| Package | level 1 | level 2 | level 3 | level 4 | level 5 | Cardinality | Datatype Name |
|---|---|---|---|---|---|---|---|
| | | | TypeCode 579030 | | | 1 579032 | QualityIssueNotificationTypeCode 579034 |
| | | | TypeName 579036 | | | 0..1 579038 | MEDIUM_Name 579040 |
| | | | ImportanceCode 579042 | | | 0..1 579044 | ImportanceCode 579046 |
| | | | Importance Name 579048 | | | 0..1 579050 | MEDIUM_Name 579052 |
| | | | Description 579054 | | | 0..1 579056 | SHORT_Description 579058 |
| Party 579060 | | | Party 579062 | | | 0..1 579064 | |

FIG. 579-3

| Package | level 1 | level 2 | level 3 | level 4 | level 5 | Cardinality | Datatype Name |
|---|---|---|---|---|---|---|---|
| BuyerParty 579066 | | | | BuyerParty 579068 | | 0..1 579070 | |
| | | | | | InternalID 579072 | 1 579074 | PartyInternalID 579076 |
| | | | | | FormattedName 579078 | 0..1 579080 | LONG_Name 579082 |
| VendorParty 579084 | | | | VendorParty 579086 | | 0..1 579088 | |
| | | | | | InternalID 579090 | 1 579092 | PartyInternalID 579094 |
| | | | | | FormattedName 579096 | 0..1 579098 | LONG_Name 5790100 |
| EmployeeResponsibleParty 5790102 | | | | EmployeeResponsibleParty 5790104 | | 0..1 5790106 | |
| | | | | | InternalID 5790108 | 1 5790110 | PartyInternalID 5790112 |

FIG. 579-4

| Package | level 1 | level 2 | level 3 | level 4 | level 5 | Cardinality | Datatype Name |
|---|---|---|---|---|---|---|---|
| | | | | | Format-tedName 5790114 | 0..1 5790116 | LONG_Name 5790118 |
| ProductRefer-ence 5790120 | | | Produc-tReference 5790122 | | | 0..1 5790124 | |
| Material 5790126 | | | | Material 5790128 | | 0..1 5790130 | |
| | | | | | InternalID 5790132 | 1 5790134 | ProductInternalID 5790136 |
| | | | | | Description 5790138 | 0..1 5790140 | SHORT_Descripti on 5790142 |
| ProcessingCondi-tions 5790144 | | Process-ingCondi-tions 5790146 | | | | 1 5790148 | |
| | | | Returned-Query-HitsNum-berValue 5790150 | | | 0..1 5790152 | NumberValue 5790154 |

FIG. 579-5

| Package | level 1 | level 2 | level 3 | level 4 | level 5 | Cardinality | Datatype Name |
|---|---|---|---|---|---|---|---|
| | | | MoreElementsAvailableIndicator 5790156 | | | 0..1 5790158 | Indicator 5790160 |
| Log 5790162 | | Log 5790164 | | | | 1 5790166 | Log 5790168 |

FIG. 588

| Package | level 1 | level 2 | level 3 | Cardinality | Datatype Name |
|---|---|---|---|---|---|
| RepetitiveManufacturingConfirmationCancelConfirmationMessage_sync 588000 | RepetitiveManufacturingConfirmationCancelConfirmationMessage_sync 588002 | | | | RepetitiveManufacturingConfirmationCancelConfirmationMessage_sync 588004 |
| MessageHeader 588006 | | MessageHeader 588008 | | 0...1 588010 | BasicBusinessDocumentMessageHeader 588012 |
| RepetitiveManufacturingConfirmation 588014 | | RepetitiveManufacturingConfirmation 588016 | | 0..1 588018 | |
| | | | ID 588020 | 1 588022 | RepetitiveManufacturingConfirmationID 588024 |
| Log 588026 | | Log 588028 | | 1 588030 | Log 588032 |

FIG. 589

| Package | level 1 | level 2 | level 3 | Cardinality | Datatype Name |
|---|---|---|---|---|---|
| RepetitiveManufacturingConfirmationCancelRequestMessage_sync 589000 | RepetitiveManufacturingConfirmationCancelRequestMessage_sync 589002 | | | | RepetitiveManufacturingConfirmationCancelRequestMessage_sync 589004 |
| MessageHeader 589006 | | MessageHeader 589008 | | 1 589010 | BasicBusinessDocumentMessageHeader 589012 |
| RepetitiveManufacturingConfirmation 589014 | | RepetitiveManufacturingConfirmation 589016 | | 0..1 589018 | |
| | | | ID 589020 | 1 589022 | RepetitiveManufacturingConfirmationID 589024 |
| | | | PostingDate 589026 | 1 589028 | Date 589030 |

FIG. 590

| Package | level 1 | level 2 | level 3 | Cardinality | Datatype Name |
|---|---|---|---|---|---|
| RepetitiveManufacturing-ConfirmationCreateConfir-mationMessage 590000 | RepetitiveManufacturing-ConfirmationCreateConfir-mationMessag 590002 | | | | RepetitiveManufacturing-ConfirmationCreateCon-firmationMessage 590004 |
| MessageHeader 590006 | | MessageHeader 590008 | | 0…1 590010 | BasicBusinessDocument-MessageHeader 590012 |
| RepetitiveManufactur-ingConfirmation 590014 | | RepetitiveManu-facturingConfir-mation 590016 | | 0..1 590018 | |
| | | | ID 590020 | 1 590022 | RepetitiveManufacturing-ConfirmationID 590024 |
| Log 590026 | | Log 590028 | | 1 590030 | Log 590032 |

FIG. 591

| Package | level 1 | level 2 | level 3 | Cardinality | Datatype Name |
|---|---|---|---|---|---|
| RepetitiveManufacturingConfirmationCreateConfirmationMessage_sync 591000 | RepetitiveManufacturingConfirmationCreateConfirmationMessage_sync 591002 | | | | RepetitiveManufacturingConfirmationCreateConfirmationMessage_sync 591004 |
| MessageHeader 591006 | | MessageHeader 591008 | | 0…1 591010 | BasicBusinessDocumentMessageHeader 591012 |
| RepetitiveManufacturingConfirmation 591014 | | RepetitiveManufacturingConfirmation 591016 | | 0..1 591018 | |
| | | | ID 591020 | 1 591022 | RepetitiveManufacturingConfirmationID 591024 |
| Log 591026 | | Log 591028 | | 1 591030 | Log 591032 |

FIG. 592-1

| Package | level 1 | level 2 | level 3 | level 4 | Cardinality | Datatype Name |
|---|---|---|---|---|---|---|
| RepetitiveManufacturingConfirmationCreateRequestMessage 592000 | RepetitiveManufacturingConfirmationCreateRequestMessage 592002 | | | | | RepetitiveManufacturingConfirmationCreateRequestMessage 592004 |
| MessageHeader 592006 | | MessageHeader 592008 | | | 1 592010 | BasicBusinessDocumentMessageHeader 592012 |
| RepetitiveManufacturingConfirmation 592014 | | RepetitiveManufacturingConfirmation 592016 | | | 1 592018 | |
| | | | MaterialInternalID 592020 | | 1 592022 | ProductInternalID 592024 |
| | | | PlantID 592026 | | 0..1 592028 | PlantID 592030 |

FIG. 592-2

| Package | level 1 | level 2 | level 3 | level 4 | Cardinality | Datatype Name |
|---|---|---|---|---|---|---|
| | | | SupplyPlanningA-realD 592032 | | 0..1 592034 | SupplyPlanningA-realD 592036 |
| | | | InventoryMan-agedLocationID 592038 | | 1 592040 | LocationInternalID 592042 |
| | | | ProductionVer-sionID 592044 | | 0..1 592046 | ProductionVer-sionID 592048 |
| | | | ProductionLine-WorkCentreID 592050 | | 0..1 592052 | WorkCentreID 592054 |
| | | | ProductionPlan-ningOrderID 592056 | | 0..1 592058 | ProductionPlannin-gOrderID 592060 |
| | | | BatchID 592062 | | 0..1 592064 | BatchID 592066 |
| | | | EmployeeID 592068 | | 0..1 592070 | EmployeeID 592072 |

FIG. 592-3

| Package | level 1 | level 2 | level 3 | level 4 | Cardinality | Datatype Name |
|---|---|---|---|---|---|---|
| | | | Compensation-Component-TypeID 592074 | | 0..1 592076 | Compensation-ComponentTypeID 592078 |
| | | | Compensation-Component-TypeGroupID 592080 | | 0..1 592082 | Compensation-ComponentType-GroupID 592084 |
| | | | SalesOrderID 592086 | | 0..1 592088 | SalesOrderID 592090 |
| | | | SalesOrderItemID 592092 | | 0..1 592094 | SalesOrderItemID 592096 |
| | | | ProductionLotPro-jectWorkBreak-downStructu-reElementID 592098 | | 0..1 5920100 | ProjectWorkBreak-downStructureEle-mentID 5920102 |
| | | | ReportingPointID 5920104 | | 0..1 5920106 | ReportingPointID 5920108 |

FIG. 592-4

| Package | level 1 | level 2 | level 3 | level 4 | Cardinality | Datatype Name |
|---|---|---|---|---|---|---|
| | | | PlantDataCollectionSystemConfirmationID 5920110 | | 0..1 5920112 | PlantDataCollectionSystemConfirmationID 5920114 |
| | | | ScenarioCode 5920116 | | 1 5920118 | RepetitiveManufacturingScenarioCode 5920120 |
| | | | TypeCode 5920122 | | 1 5920124 | RepetitiveManufacturingConfirmationTypeCode 5920126 |
| | | | ScrapQuantityScopeCode 5920128 | | 0..1 5920130 | RepetitiveManufacturingConfirmationScrapQuantityScopeCode 5920132 |
| | | | WorkQuantityScopeCode 5920134 | | 0..1 5920136 | RepetitiveManufacturingConfirmationWorkQuantityScopeCode 5920138 |

FIG. 592-5

| Package | level 1 | level 2 | level 3 | level 4 | Cardinality | Datatype Name |
|---|---|---|---|---|---|---|
| | | | GoodsIssueScopeCode 5920140 | | 0..1 5920142 | RepetitiveManufacturingConfirmationGoodsIssueScopeCode 5920144 |
| | | | LogisticsDeviationReasonCode 5920146 | | 0..1 5920148 | LogisticsDeviationReasonCode 5920150 |
| | | | Description 5920152 | | 0..1 5920154 | RepetitiveManufacturingConfirmationDescription 5920156 |
| | | | LotSizeIndependentCostsIncludedIndicator 5920158 | | 0..1 5920160 | Indicator 5920162 |
| | | | ComponentScrapIncludeIndicator 5920164 | | 0..1 5920166 | Indicator 5920168 |

FIG. 592-6

| Package | level 1 | level 2 | level 3 | level 4 | Cardinality | Datatype Name |
|---|---|---|---|---|---|---|
| | | | PostingDate 5920170 | | 1 5920172 | Date 5920174 |
| | | | CreationDate 5920176 | | 1 5920178 | Date 5920180 |
| | | | ConfirmQuantity 5920182 | | 0..1 5920184 | Quantity 5920186 |
| | | | ScrapQuantity 5920188 | | 0..1 5920190 | Quantity 5920192 |
| SerialNumber-Information 5920194 | | | SerialNumberIn-formation 5920196 | | 0..n 5920198 | |
| | | | | SerialID 5920200 | 1 5920202 | SerialID 5920204 |
| GoodsMove-mentInforma-tion 5920206 | | | GoodsMove-mentInformation 5920208 | | 0..n 5920210 | |
| | | | | MaterialInter-nalID 5920212 | 1 5920214 | ProductInternalID 5920216 |

FIG. 592-7

| Package | level 1 | level 2 | level 3 | level 4 | Cardinality | Datatype Name |
|---|---|---|---|---|---|---|
| | | | | PlantID 5920218 | 1 5920220 | PlantID 5920222 |
| | | | | InventoryManagedLocationInternalID 5920224 | 1 5920226 | LocationInternalID 5920228 |
| | | | | BatchID 5920230 | 0..1 5920232 | BatchID 5920234 |
| | | | | ConsignmentStockVendorID 5920236 | 0..1 5920238 | PartyInternalID 5920240 |
| | | | | ConsignmentStockCustomerID 5920242 | 0..1 5920244 | BusinessPartnerID 5920246 |
| | | | | SalesOrderID 5920248 | 0..1 5920250 | SalesOrderID 5920252 |
| | | | | SalesOrderItemID 5920254 | 0..1 5920256 | SalesOrderItemID 5920258 |

FIG. 592-8

| Package | level 1 | level 2 | level 3 | level 4 | Cardinality | Datatype Name |
|---|---|---|---|---|---|---|
| | | | | ReservationID 5920260 | 0..1 5920262 | ReservationID 5920264 |
| | | | | Reservatio-nItemID 5920266 | 0..1 5920268 | ReservationItemID 5920270 |
| | | | | ProjectWork-BreakdownStruc-tureElementID 5920272 | 0..1 5920274 | ProjectWorkBreak-downStructureEle-mentID 5920276 |
| | | | | GoodsMove-mentTypeCode 5920278 | 1 5920280 | GoodsMovement-TypeCode 5920282 |
| | | | | InventoryUsabili-tyStatusCode 5920284 | 0..1 5920286 | InventoryUsabili-tyStatusCode 5920288 |
| | | | | InventorySpe-cialStockType-Code 5920290 | 0..1 5920292 | InventorySpecial-StockTypeCode 5920294 |

FIG. 592-9

| Package | level 1 | level 2 | level 3 | level 4 | Cardinality | Datatype Name |
|---|---|---|---|---|---|---|
| | | | | InventoryValuationTypeCode 5920296 | 0..1 5920298 | InventoryValuationTypeCode 5920300 |
| | | | | InputQuantity 5920302 | 1 5920304 | Quantity 5920306 |
| | | | | DeliveryCompleteIndicator 5920308 | 0..1 5920310 | Indicator 5920312 |
| | | | | WithdrawnCompleteIndicator 5920314 | 0..1 5920316 | Indicator 5920318 |
| | | | | GoodsMovementItemDescription 5920320 | 0..1 5920322 | GoodsMovementItemDescription 5920324 |
| | | | | GoodsRecipientName 5920326 | 0..1 5920328 | GoodsRecipientName 5920330 |
| | | | | UnloadingPointName 5920332 | 0..1 5920334 | UnloadingPointName 5920336 |

FIG. 592-10

| Package | level 1 | level 2 | level 3 | level 4 | Cardinality | Datatype Name |
|---|---|---|---|---|---|---|
| | | | | GoodsMovementReference-DocumentType-Code 5920338 | 1 5920340 | GoodsMovementReferenceDocumentTypeCode 5920342 |
| | | | | GoodsMovementReasonCode 5920344 | 0..1 5920346 | GoodsMovementReasonCode 5920348 |
| | | | | BatchExpirationDate 5920350 | 0..1 5920352 | Date 5920354 |
| | | | | BatchProductionDate 5920356 | 0..1 5920358 | Date 5920360 |

FIG. 593-1

| Package | level 1 | level 2 | level 3 | level 4 | Cardinality | Datatype Name |
| --- | --- | --- | --- | --- | --- | --- |
| RepetitiveManufacturingConfirmationCreateRequestMessage_sync 593000 | RepetitiveManufacturingConfirmationCreateRequestMessage_sync 593002 | | | | | RepetitiveManufacturingConfirmationCreateRequestMessage_sync 593004 |
| MessageHeader 593006 | | MessageHeader 593008 | | | 1 593010 | BasicBusinessDocumentMessageHeader 593012 |
| RepetitiveManufacturingConfirmation 593014 | | RepetitiveManufacturingConfirmation 593016 | | | 1 593018 | |
| | | | MaterialInternalID 593020 | | 1 593022 | ProductInternalID 593024 |
| | | | PlantID 593026 | | 0..1 593028 | PlantID 593030 |

FIG. 593-2

| Package | level 1 | level 2 | level 3 | level 4 | Cardinality | Datatype Name |
|---|---|---|---|---|---|---|
| | | | SupplyPlanningAreaID 593032 | | 0..1 593034 | SupplyPlanningAreaID 593036 |
| | | | InventoryManagedLocationInternalID 593038 | | 1 593040 | LocationInternalID 593042 |
| | | | ProductionVersionID 593044 | | 0..1 593046 | ProductionVersionID 593048 |
| | | | ProductionLineWorkCentreID 593050 | | 0..1 593052 | WorkCentreID 593054 |
| | | | ProductionPlanningOrderID 593056 | | 0..1 593058 | ProductionPlanningOrderID 593060 |
| | | | BatchID 593062 | | 0..1 593064 | BatchID 593066 |

FIG. 593-3

| Package | level 1 | level 2 | level 3 | level 4 | Cardinality | Datatype Name |
|---|---|---|---|---|---|---|
| | | | EmployeeID 593068 | | 0..1 593070 | EmployeeID 593072 |
| | | | Compensation-Component-TypeID 593074 | | 0..1 593076 | Compensation-Component-TypeID 593078 |
| | | | Compensation-Component-TypeGroupID 593080 | | 0..1 593082 | Compensation-Component-TypeGroupID 593084 |
| | | | SalesOrderID 593086 | | 0..1 593088 | SalesOrderID 593090 |
| | | | SalesOrde-rItemID 593092 | | 0..1 593094 | SalesOrde-rItemID 593096 |
| | | | ProductionLot-ProjectWork-Breakdown-StructureEle-mentID 593098 | | 0..1 5930100 | ProjectWork-Breakdown-StructureEle-mentID 5930102 |

FIG. 593-4

| Package | level 1 | level 2 | level 3 | level 4 | Cardinality | Datatype Name |
|---|---|---|---|---|---|---|
| | | | ReportingPoin-tID 5930104 | | 0..1 5930106 | ReportingPoin-tID 5930108 |
| | | | PlantDataCol-lectionSystem-ConfirmationID 5930110 | | 0..1 5930112 | PlantDataCol-lectionSystem-ConfirmationID 5930114 |
| | | | RepetitiveManu-facturingSce-narioCode 5930116 | | 1 5930118 | RepetitiveManu-facturingSce-narioCode 5930120 |
| | | | TypeCode 5930122 | | 1 5930124 | RepetitiveManu-facturingConfir-mationType-Code 5930126 |
| | | | ScrapQuantity-ScopeCode 5930128 | | 0..1 5930130 | RepetitiveManu-facturingConfir-mation-ScrapQuantity-ScopeCode 5930132 |

FIG. 593-5

| Package | level 1 | level 2 | level 3 | level 4 | Cardinality | Datatype Name |
|---|---|---|---|---|---|---|
| | | | WorkQuantity-ScopeCode 5930134 | | 0..1 5930136 | RepetitiveManu-facturingConfir-mation-WorkQuantity-ScopeCode 5930138 |
| | | | GoodsIs-sueScopeCode 5930140 | | 0..1 5930142 | RepetitiveManu-facturingConfir-mationGoodsIs-sueScopeCode 5930144 |
| | | | LogisticsDevia-tionReason-Code 5930146 | | 0..1 5930148 | LogisticsDevia-tionReason-Code 5930150 |
| | | | Description 5930152 | | 0..1 5930154 | RepetitiveManu-facturingConfir-mationDescrip-tion 5930156 |

FIG. 593-6

| Package | level 1 | level 2 | level 3 | level 4 | Cardinality | Datatype Name |
|---|---|---|---|---|---|---|
| | | | LotSizeIndependentCostsIncludedIndicator 5930158 | | 0..1 5930160 | Indicator 5930162 |
| | | | ComponentScrapIncludeIndicator 5930164 | | 0..1 5930166 | Indicator 5930168 |
| | | | PostingDate 5930170 | | 1 5930172 | Date 5930174 |
| | | | CreationDate 5930176 | | 1 5930178 | Date 5930180 |
| | | | ConfirmQuantity 5930182 | | 0..1 5930184 | Quantity 5930186 |
| | | | ScrapQuantity 5930188 | | 0..1 5930190 | Quantity 5930192 |
| SerialNumberInformation 5930194 | | | SerialNumberInformation 5930196 | | 0..n 5930198 | |

FIG. 593-7

| Package | level 1 | level 2 | level 3 | level 4 | Cardinality | Datatype Name |
|---|---|---|---|---|---|---|
| | | | | SerialID 5930200 | 1 5930202 | SerialID 5930204 |
| GoodsMovementInformation 5930206 | | | GoodsMovementInformation 5930208 | | 0..n 5930210 | |
| | | | | MaterialInternalID 5930212 | 1 5930214 | ProductInternalID 5930216 |
| | | | | PlantID 5930218 | 1 5930220 | PlantID 5930222 |
| | | | | InventoryManagedLocationInternalID 5930224 | 1 5930226 | LocationInternalID 5930228 |
| | | | | BatchID 5930230 | 0..1 5930232 | BatchID 5930234 |
| | | | | ConsignmentStockVendorID 5930236 | 0..1 5930238 | PartyInternalID 5930240 |

FIG. 593-8

| Package | level 1 | level 2 | level 3 | level 4 | Cardinality | Datatype Name |
|---|---|---|---|---|---|---|
| | | | | ConsignmentStockCustomerID 5930242 | 0..1 5930244 | BusinessPartnerID 5930246 |
| | | | | SalesOrderID 5930248 | 0..1 5930250 | SalesOrderID 5930252 |
| | | | | SalesOrderItemID 5930254 | 0..1 5930256 | SalesOrderItemID 5930258 |
| | | | | ReservationID 5930260 | 0..1 5930262 | ReservationID 5930264 |
| | | | | ReservationItemID 5930266 | 0..1 5930268 | ReservationItemID 5930270 |
| | | | | ProjectWorkBreakdownStructureElementID 5930272 | 0..1 5930274 | ProjectWorkBreakdownStructureElementID 5930276 |

FIG. 593-9

| Package | level 1 | level 2 | level 3 | level 4 | Cardinality | Datatype Name |
|---|---|---|---|---|---|---|
| | | | | GoodsMovementTypeCode 5930278 | 1 5930280 | GoodsMovementTypeCode 5930282 |
| | | | | InventoryUsabilityCode 5930284 | 0..1 5930286 | InventoryUsabilityCode 5930288 |
| | | | | InventorySpecialStockTypeCode 5930290 | 0..1 5930292 | InventorySpecialStockTypeCode 5930294 |
| | | | | InventoryValuationTypeCode 5930296 | 0..1 5930298 | InventoryValuationTypeCode 5930300 |
| | | | | InputQuantity 5930302 | 1 5930304 | Quantity 5930306 |
| | | | | DeliveryCompleteIndicator 5930308 | 0..1 5930310 | Indicator 5930312 |

FIG. 593-10

| Package | level 1 | level 2 | level 3 | level 4 | Cardinality | Datatype Name |
|---|---|---|---|---|---|---|
| | | | | WithdrawnCompleteIndicator 5930314 | 0..1 5930316 | Indicator 5930318 |
| | | | | GoodsMovementItemDescription 5930320 | 0..1 5930322 | GoodsMovementItemDescription 5930324 |
| | | | | GoodsRecipientName 5930326 | 0..1 5930328 | GoodsRecipientName 5930330 |
| | | | | UnloadingPointName 5930332 | 0..1 5930334 | UnloadingPointName 5930336 |
| | | | | GoodsMovementReferenceDocumentTypeCode 5930338 | 1 5930340 | GoodsMovementReferenceDocumentTypeCode 5930342 |

FIG. 593-11

| Package | level 1 | level 2 | level 3 | level 4 | Cardinality | Datatype Name |
|---|---|---|---|---|---|---|
| | | | | GoodsMovementReasonCode 5930344 | 0..1 5930346 | GoodsMovementReasonCode 5930348 |
| | | | | BatchExpirationDate 5930350 | 0..1 5930352 | Date 5930354 |
| | | | | BatchProductionDate 5930356 | 0..1 5930358 | Date 5930360 |

FIG. 604-1

| Package | level 1 | level 2 | level 3 | Cardinality | Datatype Name |
|---|---|---|---|---|---|
| SalesOrder-BasicDataBy-BuyerAnd-BasicDataQuery-Message_sync 604000 | SalesOrder-BasicDataBy-BuyerAnd-BasicDataQue-ryMessage_sync 604002 | | | | SalesOrderBasicDa-taByBuyerAnd-BasicDataQueryMes-sage_sync 604004 |
| Selection 604006 | | SalesOrder-BasicDataSelec-tionByBuyerAnd-BasicData 604008 | | 1 604010 | |
| | | | SalesOrderBuyerParty-InternalID 604012 | 1 604014 | PartyInternalID 604016 |
| | | | SalesOrderSalesOrganisa-tionPartyInternalID 604018 | 0..1 604020 | PartyInternalID 604022 |
| | | | SalesOrderSalesOffice-PartyInternalID 604024 | 0..1 604026 | PartyInternalID 604028 |
| | | | SalesOrderSalesGroup-PartyInternalID 604030 | 0..1 604032 | PartyInternalID 604034 |

FIG. 604-2

| Package | level 1 | level 2 | level 3 | Cardinality | Datatype Name |
|---|---|---|---|---|---|
| | | | SalesOrderProcessing-TypeCode 604036 | 0..1 604038 | BusinessTransaction-DocumentProcess-ingTypeCode 604040 |
| | | | SalesOrderSalesTermsDis-tributionChannelCode 604042 | 0..1 604044 | DistributionChannel-Code 604046 |
| | | | SalesOrderSalesTermsDi-visionCode 604048 | 0..1 604050 | DivisionCode 604052 |

FIG. 605-1

| Package | level 1 | level 2 | level 3 | level 4 | Cardinality | Datatype Name |
|---|---|---|---|---|---|---|
| SalesOrder-BasicDataBy-BuyerAndBasicDataResponseMessage_sync 605000 | SalesOrder-BasicDataBy-BuyerAndBasicDataResponseMessage_sync 605002 | | | | | SalesOrderBasicDataByBuyer-AndBasicDataResponseMessage_sync 605004 |
| | | | ID 605006 | | 1 605008 | BusinessDocumentMessageID 605010 |
| | | | Creation-DateTime 605012 | | 1 605014 | DateTime 605016 |
| | | | ... | | 0..1 | ... |
| SalesOrder 605020 | | SalesOrder 605022 | | | 0..N 605024 | |
| | | | ID 605026 | | 1 605028 | SalesOrderID 605030 |
| | | | Process-ingType-Code 605032 | | 0..1  605034 | BusinessTransactionDocument-ProcessingTypeCode 605036 |

FIG. 605-2

| Package | level 1 | level 2 | level 3 | level 4 | Cardinality | Datatype Name |
|---|---|---|---|---|---|---|
| | | | Process-ing-TypeName 605038 | | 0..1 605040 | LEN20_Name, Qualifier: Process-ingType 605042 |
| | | | BuyerID 605044 | | 0..1 605046 | BusinessTransactionDocumentID 605048 |
| Party 605050 | | | Buyer-Party 605052 | | 1 605054 | |
| | | | | InternalID 605056 | 1 605058 | PartyInternalID 605060 |
| | | | | Format-tedName 605062 | 0..1 605064 | LONG_Name, Qualifier: PartyFor-matted 605066 |
| | | | SalesOr-ganisa-tionParty 605068 | | 1 605070 | |
| | | | | InternalID 605072 | 1 605074 | PartyInternalID 605076 |

FIG. 605-3

| Package | level 1 | level 2 | level 3 | level 4 | Cardinality | Datatype Name |
|---|---|---|---|---|---|---|
| | | | | Format-tedName 605078 | 0..1 605080 | LONG_Name, Qualifier: PartyFor-matted 605082 |
| | | | Sale-sOffice-Party 605084 | | 0..1 605086 | |
| | | | | InternalID 605088 | 1 605090 | PartyInternalID 605092 |
| | | | | Format-tedName 605094 | 0..1 605096 | LONG_Name, Qualifier: PartyFor-matted 605098 |
| | | | Sales-Group-Party 6050100 | | 0..1 6050102 | |
| | | | | InternalID 6050104 | 1 6050106 | PartyInternalID 6050108 |
| | | | | Format-tedName 6050110 | 0..1 6050112 | LONG_Name, Qualifier: PartyFor-matted 6050114 |

FIG. 605-4

| Package | level 1 | level 2 | level 3 | level 4 | Cardinality | Datatype Name |
|---|---|---|---|---|---|---|
| SalesTerms 6050116 | | | Sales-Terms 6050118 | | 0..1 6050120 | |
| | | | | Distribu-tionChan-nelCode 6050122 | 0..1 6050124 | DistributionChannelCode 6050126 |
| | | | | Distribu-tionChan-nelName 6050128 | 0..1 6050130 | LEN20_Name, Qualifier: Distribu-tionChannel 6050132 |
| | | | | Division-Code 6050134 | 0..1 6050136 | DivisionCode 6050138 |
| | | | | Division-Name 6050140 | 0..1 6050142 | LEN20_Name, Qualifier: Division 6050144 |
| DateTerms 6050146 | | | DateTerm s 6050148 | | 0..1 6050150 | |

FIG. 605-5

| Package | level 1 | level 2 | level 3 | level 4 | Cardinality | Datatype Name |
|---|---|---|---|---|---|---|
| | | | | Request-Date 6050152 | 0..1 6050154 | Date 6050156 |
| TotalValues 6050158 | | | TotalVal-ues 6050160 | | 0..1 6050162 | |
| | | | | NetA-mount 6050164 | 0..1 6050166 | Amount 6050168 |
| Log 6050170 | | Log 6050172 | | | 1 6050174 | Log 6050176 |

FIG. 606

| Package | level 1 | level 2 | level 3 | Cardinality | Datatype Name |
|---|---|---|---|---|---|
| SalesOrderBasicDataBy-BuyerAndCreditBlocked-QueryMessage_sync 606000 | SalesOrder-BasicDataBy-BuyerAnd-CreditBlock-edQueryMes-sage_sync 606002 | | | | SalesOrderBasicDataByBuyerAnd-CreditBlockedQueryMessage_sync 606004 |
| Selection 606006 | | SalesOrder-BasicDataSe-lectionBy-BuyerAnd-Credit-Blocked 606008 | | 1 606010 | |
| | | | SalesOrder-BuyerParty-InternalID 606012 | 1 606014 | PartyInternalID 606016 |

FIG. 607-1

| Package | level 1 | level 2 | level 3 | level 4 | Cardinality | Datatype Name |
|---|---|---|---|---|---|---|
| SalesOrder-BasicDataBy-BuyerAndCredit-BlockedRespon-seMessage_sync 607000 | SalesOrder-BasicDataBy-BuyerAndCredit-BlockedRespon-seMessage_sync 607002 | | | | | SalesOrderBasicDataBy-BuyerAndCreditBlock-edResponseMes-sage_sync 607004 |
| | | | ID 607006 | | 1 607008 | BusinessDocumentMes-sageID 607010 |
| | | | Creation-DateTime 607012 | | 1 607014 | DateTime 607016 |
| | | | ... | | 0..1 | ... |
| SalesOrder 607020 | | SalesOrder 607022 | | | 0..N 607024 | |
| | | | ID 607026 | | 1 607028 | SalesOrderID 607030 |
| | | | Processing-TypeCode 607032 | | 0..1 607034 | BusinessTransaction-DocumentProcessing-TypeCode 607036 |

FIG. 607-2

| Package | level 1 | level 2 | level 3 | level 4 | Cardinality | Datatype Name |
|---|---|---|---|---|---|---|
| | | | Processing-TypeName 607038 | | 0..1 607040 | LEN20_Name, Qualifier: ProcessingType 607042 |
| | | | BuyerID 607044 | | 0..1 607046 | BusinessTransaction-DocumentID 607048 |
| Party 607050 | | | BuyerParty 607052 | | 1 607054 | |
| | | | | InternalID 607056 | 1 607058 | PartyInternalID 607060 |
| | | | | Formatted-Name 607062 | 0..1 607064 | LONG_Name, Qualifier: PartyFormatted 607066 |
| | | | SalesOrganisa-tionParty 607068 | | 1 607070 | |
| | | | | InternalID 607072 | 1 607074 | PartyInternalID 607076 |
| | | | | Formatted-Name 607078 | 0..1 607080 | LONG_Name, Qualifier: PartyFormatted 607082 |

FIG. 607-3

| Package | level 1 | level 2 | level 3 | level 4 | Cardinality | Datatype Name |
|---|---|---|---|---|---|---|
| | | | SalesOffice-Party 607084 | | 0..1 607086 | |
| | | | | InternalID 607088 | 1 607090 | PartyInternalID 607092 |
| | | | | Formatted-Name 607094 | 0..1 607096 | LONG_Name, Qualifier: PartyFormatted 607098 |
| | | | SalesGroup-Party 6070100 | | 0..1 6070102 | |
| | | | | InternalID 6070104 | 1 6070106 | PartyInternalID 6070108 |
| | | | | Formatted-Name 6070110 | 0..1 6070112 | LONG_Name, Qualifier: PartyFormatted 6070114 |
| SalesTerms 6070116 | | | SalesTerms 6070118 | | 0..1 6070120 | |
| | | | | Distribution-ChannelCode 6070122 | 0..1 6070124 | DistributionChannelCode 6070126 |

FIG. 607-4

| Package | level 1 | level 2 | level 3 | level 4 | Cardinality | Datatype Name |
|---|---|---|---|---|---|---|
| | | | | Distribution-ChannelName 6070128 | 0..1 6070130 | LEN20_Name, Qualifier: DistributionChannel 6070132 |
| | | | | DivisionCode 6070134 | 0..1 6070136 | DivisionCode 6070138 |
| | | | | DivisionName 6070140 | 0..1 6070142 | LEN20_Name, Qualifier: Division 6070144 |
| DateTerms 6070146 | | | DateTerms 6070148 | | 0..1 6070150 | |
| | | | | RequestDate 6070152 | 0..1 6070154 | Date 6070156 |
| TotalValues 6070158 | | | TotalValues 6070160 | | 0..1 6070162 | |
| | | | | NetAmount 6070164 | 0..1 6070166 | Amount 6070168 |
| Log 6070170 | | Log 6070172 | | | 1 6070174 | Log 6070176 |

FIG. 608

| Package | level 1 | level 2 | level 3 | Cardinality | Datatype Name |
|---|---|---|---|---|---|
| SalesOrderBasicDataByBuyerAndDeliveryBlockQueryMessage_sync 608000 | SalesOrderBasicDataByBuyerAndDeliveryBlockedQueryMessage_sync 608002 | | | | SalesOrderBasicDataByBuyerAndDeliveryBlockedQueryMessage_sync 608004 |
| | | | ID 608006 | 1 608008 | BusinessDocumentMessageID 608010 |
| | | | CreationDateTime 608012 | 1 608014 | DateTime 608016 |
| | | | ... | 0..1 | ... |
| Selection 608020 | | SalesOrderBasicDataSelectionByBuyerAndDeliveryBlocked 608022 | | 1 608024 | |
| | | | SalesOrderBuyerPartyInternalID 608026 | 1 608028 | PartyInternalID 608030 |

FIG. 609-1

| Package | level 1 | level 2 | level 3 | level 4 | Cardinality | Datatype Name |
|---|---|---|---|---|---|---|
| SalesOrder-BasicDataBy-BuyerAndDelivery-BlockedResponse-Message_sync 609000 | SalesOrder-BasicDataBy-BuyerAndDelivery-BlockedRespon-seMessage_sync 609002 | | | | | SalesOrderBasicDataByBuyer-AndDeliveryBlockedResponse-Message_sync 609004 |
| | | | ID 609006 | | 1 609008 | BusinessDocumentMessageID 609010 |
| | | | Creation-DateTime 609012 | | 1 609014 | DateTime 609016 |
| | | | ... | | 0..1 | ... |
| SalesOrder 609020 | | SalesOrder 609022 | | | 0..N 609024 | |
| | | | ID 609026 | | 1 609028 | SalesOrderID 609030 |
| | | | Date 609032 | | 0..1 609034 | Date 609036 |

FIG. 609-2

| Package | level 1 | level 2 | level 3 | level 4 | Cardinality | Datatype Name |
|---|---|---|---|---|---|---|
| | | | ProcessingTypeCode 609038 | | 0..1 609040 | BusinessTransactionDocumentProcessingTypeCode 609042 |
| | | | BuyerID 609044 | | 0..1 609046 | BusinessTransactionDocumentID 609048 |
| Party 609050 | | | BuyerParty 609052 | | 1 609054 | |
| | | | | InternalID 609056 | 1 609058 | PartyInternalID 609060 |
| | | | | FormattedName 609062 | 0..1 609064 | LONG_Name, Qualifier: PartyFormatted 609066 |
| | | | SalesOrganisationParty 609068 | | 1 609070 | |
| | | | | InternalID 609072 | 1 609074 | PartyInternalID 609076 |
| SalesTerms 609078 | | | SalesTerms 609080 | | 0..1 609082 | |

FIG. 609-3

| Package | level 1 | level 2 | level 3 | level 4 | Cardinality | Datatype Name |
|---|---|---|---|---|---|---|
| | | | | Distribu-tionChan-nelCode 609084 | 0..1 609086 | DistributionChannelCode 609088 |
| | | | | Division-Code 609090 | 0..1 609092 | DivisionCode 609094 |
| PricingTerms 609096 | | | PricingTerms 609098 | | 0..1 6090100 | |
| | | | | Currency-Code 6090102 | 0..1 6090104 | CurrencyCode 6090106 |
| TotalValues 6090108 | | | TotalValues 6090110 | | 0..1 6090112 | |
| | | | | NetAmount 6090114 | 0..1 6090116 | Amount 6090118 |
| Log 6090120 | | Log 6090122 | | | 1 6090124 | Log 6090126 |

FIG. 610

| Package | level 1 | level 2 | level 3 | Cardinality | Datatype Name |
|---|---|---|---|---|---|
| SalesOrderBasicDataByBuyerAndIncompletenessQueryMessage_sync 610000 | SalesOrderBasicDataByBuyerAndIncompletenessQueryMessage_sync 610002 | | | | SalesOrderBasicDataByBuyerAndIncompletenessQueryMessage_sync 610004 |
| Selection 610006 | | SalesOrderBasicDataSelectionByBuyerAndBasicData 610008 | | 1 610010 | |
| | | | SalesOrderBuyerPartyInternalID 610012 | 1 610014 | PartyInternalID 610016 |

FIG. 611-1

| Package | level 1 | level 2 | level 3 | level 4 | Cardinality | Datatype Name |
|---|---|---|---|---|---|---|
| SalesOrderBasicDataByBuyerAndIncompletenessResponse-Message_sync 611000 | SalesOrderBasicDataByBuyerAndIncompletenessResponse-Message_sync 611002 | | | | | SalesOrderBasicDataByBuyerAndIncompletenessResponseMessage_sync 611004 |
| | | | ID 611006 | | 1 611008 | BusinessDocumentMessageID 611010 |
| | | | Creation-DateTime 611012 | | 1 611014 | DateTime 611016 |
| | | | ... | | 0..1 | ... |
| SalesOrder 611020 | | SalesOrder 611022 | | | 0..N 611024 | |
| | | | ID 611026 | | 1 611028 | SalesOrderID 611030 |
| | | | ProcessingType-Code 611032 | | 0..1 611034 | BusinessTransaction-DocumentProcessing-TypeCode 611036 |

FIG. 611-2

| Package | level 1 | level 2 | level 3 | level 4 | Cardinality | Datatype Name |
|---|---|---|---|---|---|---|
| | | | Processing-TypeName 611038 | | 0..1 611040 | LEN20_Name, Qualifier: ProcessingType 611042 |
| | | | BuyerID 611044 | | 0..1 611046 | BusinessTransaction-DocumentID 611048 |
| Party 611050 | | | BuyerParty 611052 | | 1 611054 | |
| | | | | InternalID 611056 | 1 611058 | PartyInternalID 611060 |
| | | | | Formatted-Name 611062 | 0..1 611064 | LONG_Name, Qualifier: PartyFormatted 611066 |
| | | | SalesOr-ganisation-Party 611068 | | 1 611070 | |
| | | | | InternalID 611072 | 1 611074 | PartyInternalID 611076 |

FIG. 611-3

| Package | level 1 | level 2 | level 3 | level 4 | Cardinality | Datatype Name |
|---|---|---|---|---|---|---|
| | | | | Formatted-Name 611078 | 0..1 611080 | LONG_Name, Qualifier: PartyFormatted 611082 |
| | | | Sale-sOfficeParty 611084 | | 0..1 611086 | |
| | | | | InternalID 611088 | 1 611090 | PartyInternalID 611092 |
| | | | | Formatted-Name 611094 | 0..1 611096 | LONG_Name, Qualifier: PartyFormatted 611098 |
| | | | Sales-GroupParty 6110100 | | 0..1 6110102 | |
| | | | | InternalID 6110104 | 1 6110106 | PartyInternalID 6110108 |
| | | | | Formatted-Name 6110110 | 0..1 6110112 | LONG_Name, Qualifier: PartyFormatted 6110114 |
| SalesTerms 6110116 | | | SalesTerms 6110118 | | 0..1 6110120 | |

FIG. 611-4

| Package | level 1 | level 2 | level 3 | level 4 | Cardinality | Datatype Name |
|---|---|---|---|---|---|---|
| | | | | Distribution-Channel-Code 6110122 | 0..1 6110124 | DistributionChannelCode 6110126 |
| | | | | Distribution-Channel-Name 6110128 | 0..1 6110130 | LEN20_Name, Qualifier: DistributionChannel 6110132 |
| | | | | Division-Code 6110134 | 0..1 6110136 | DivisionCode 6110138 |
| | | | | Division-Name 6110140 | 0..1 6110142 | LEN20_Name, Qualifier: Division 6110144 |
| DateTerms 6110146 | | | DateTerms 6110148 | | 0..1 6110150 | |
| | | | | RequestDate 6110152 | 0..1 6110154 | Date 6110156 |
| TotalValues 6110158 | | | TotalValues 6110160 | | 0..1 6110162 | |

FIG. 611-5

| Package | level 1 | level 2 | level 3 | level 4 | Cardinality | Datatype Name |
|---|---|---|---|---|---|---|
| | | | | NetAmount 6110164 | 0..1 6110166 | Amount 6110168 |
| Log 6110170 | | Log 6110172 | | | 1 6110174 | Log 6110176 |

FIG. 612

| Package | level 1 | level 2 | level 3 | Cardinality | Datatype Name |
|---|---|---|---|---|---|
| SalesOrderBasicDataByBuyerAndInvoicingBlockedQueryMessage_sync 612000 | SalesOrderBasicDataByBuyerAndInvoicingBlockedQueryMessage_sync 612002 | | | | SalesOrderBasicDataByBuyerAndInvoicingBlockedQueryMessage_sync 612004 |
| Selection 612006 | | SalesOrder-BasicDataSelectionBy-BuyerAnd-BasicData 612008 | | 1 612010 | |
| | | | SalesOrder-BuyerParty-InternalID 612012 | 1 612014 | PartyInternalID 612016 |

FIG. 613-1

| Package | level 1 | level 2 | level 3 | level 4 | Cardinality | Datatype Name |
|---|---|---|---|---|---|---|
| SalesOrderBasicDataByBuyerAndInvoicingBlockedResponseMessage_sync 613000 | SalesOrderBasicDataByBuyerAndInvoicingBlockedResponseMessage_sync 613002 | | | | | SalesOrderBasicDataByBuyerAndInvoicingBlockedResponseMessage_sync 613004 |
| | | | ID 613006 | | 1 613008 | BusinessDocumentMessageID 613010 |
| | | | CreationDateTime 613012 | | 1 613014 | DateTime 613016 |
| | | | ... | | 0..1 | ... |
| SalesOrder 613020 | | SalesOrder 613022 | | | 0..N 613024 | |
| | | | ID 613026 | | 1 613028 | SalesOrderID 613030 |
| | | | ProcessingTypeCode 613032 | | 0..1 613034 | BusinessTransactionDocumentProcessingTypeCode 613036 |

FIG. 613-2

| Package | level 1 | level 2 | level 3 | level 4 | Cardinality | Datatype Name |
|---|---|---|---|---|---|---|
| | | | Processing-TypeName 613038 | | 0..1 613040 | LEN20_Name, Qualifier: ProcessingType 613042 |
| | | | BuyerID 613044 | | 0..1 613046 | BusinessTransactionDocumentID 613048 |
| Party 613050 | | | BuyerParty 613052 | | 1 613054 | |
| | | | | InternalID 613056 | 1 613058 | PartyInternalID 613060 |
| | | | | Formatted-Name 613062 | 0..1 613064 | LONG_Name, Qualifier: PartyFormatted 613066 |
| | | | SalesOr-ganisation-Party 613068 | | 1 613070 | |
| | | | | InternalID 613072 | 1 613074 | PartyInternalID 613076 |
| | | | | Formatted-Name 613078 | 0..1 613080 | LONG_Name, Qualifier: PartyFormatted 613082 |

FIG. 613-3

| Package | level 1 | level 2 | level 3 | level 4 | Cardinality | Datatype Name |
|---|---|---|---|---|---|---|
| | | | SalesOffice-Party 613084 | | 0..1 613086 | |
| | | | | InternalID 613088 | 1 613090 | PartyInternalID 613092 |
| | | | | Formatted-Name 613094 | 0..1 613096 | LONG_Name, Quali-fier: PartyFormatted 613098 |
| | | | Sales-GroupParty 6130100 | | 0..1 6130102 | |
| | | | | InternalID 6130104 | 1 6130106 | PartyInternalID 6130108 |
| | | | | Formatted-Name 6130110 | 0..1 6130112 | LONG_Name, Quali-fier: PartyFormatted 6130114 |
| SalesTerms 6130116 | | | SalesTerms 6130118 | | 0..1 6130120 | |
| | | | | Distribution-ChannelCode 6130122 | 0..1 6130124 | DistributionChannel-Code 6130126 |

FIG. 613-4

| Package | level 1 | level 2 | level 3 | level 4 | Cardinality | Datatype Name |
|---|---|---|---|---|---|---|
| | | | | Distribution-ChannelName 6130128 | 0..1 6130130 | LEN20_Name, Qualifier: DistributionChannel 6130132 |
| | | | | DivisionCode 6130134 | 0..1 6130136 | DivisionCode 6130138 |
| | | | | DivisionName 6130140 | 0..1 6130142 | LEN20_Name, Qualifier: Division 6130144 |
| DateTerms 6130146 | | | DateTerms 6130148 | | 0..1 6130150 | |
| | | | | RequestDate 6130152 | 0..1 6130154 | Date 6130156 |
| TotalValues 6130158 | | | TotalValues 6130160 | | 0..1 6130162 | |
| | | | | NetAmount 6130164 | 0..1 6130166 | Amount 6130168 |
| Log 6130170 | | Log 6130172 | | | 1 6130174 | Log 6130176 |

FIG. 614

| Package | level 1 | level 2 | level 3 | Cardinality | Datatype Name |
|---|---|---|---|---|---|
| SalesOrderByIdQuery-Message_sync 614000 | SalesOrderByIdQuery-Message_sync 614002 | | | | SalesOrderByIDQuery-Message_sync 614004 |
| | | | ID 614006 | 1 614008 | BusinessDocumentMessageID 614010 |
| | | | CreationDateTime 614012 | 1 614014 | DateTime 614016 |
| | | | ... | 0..1 | ... |
| Selection 614020 | | SalesOrder-Selection-ByID 614022 | | 1 614024 | |
| | | | ID 614026 | 1 614028 | SalesOrderID 614030 |

FIG. 615-1

| Package | level 1 | level 2 | level 3 | level 4 | level 5 | Cardinality | Datatype Name |
|---|---|---|---|---|---|---|---|
| SalesOrderByIDResponseMessage_sync 615000 | SalesOrderByIDResponseMessage_sync 615002 | | | | | | SalesOrderByIDResponseMessage_sync 615004 |
| | | | ID 615006 | | | 1 615008 | BusinessDocumentMessageID 615010 |
| | | | CreationDateTime 615012 | | | 1 615014 | DateTime 615016 |
| | | | ... | | | 0..1 | ... |
| SalesOrder 615020 | | SalesOrder 615022 | | | | 0..1 615024 | |
| | | | ID 615026 | | | 1 615028 | SalesOrderID 615030 |
| | | | Date 615032 | | | 0..1 615034 | Date 615036 |

FIG. 615-2

| Package | level 1 | level 2 | level 3 | level 4 | level 5 | Cardinality | Datatype Name |
|---|---|---|---|---|---|---|---|
| | | | ProcessingTypeCode 615038 | | | 0..1 615040 | BusinessTransactionDocumentProcessingTypeCode 615042 |
| | | | BuyerID 615044 | | | 0..1 615046 | BusinessTransactionDocumentID 615048 |
| | | | DeliveryBlockingReasonCode 615050 | | | 0..1 615052 | BlockingReasonCode 615054 |
| | | | InvoiceBlockingReasonCode 615056 | | | 0..1 615058 | BlockingReasonCode 615060 |
| Party 615062 | | | BuyerParty 615064 | | | 1 615066 | |

FIG. 615-3

| Package | level 1 | level 2 | level 3 | level 4 | level 5 | Cardinality | Datatype Name |
|---|---|---|---|---|---|---|---|
| | | | | InternalID 615068 | | 1 615070 | PartyInternalID 615072 |
| | | | | Formatted-Name 615074 | | 0..1 615076 | LONG_Name, Qualifier: Party-Formatted 615078 |
| | | | GoodsRe-cipient-Party 615080 | | | 0..1 615082 | |
| | | | | InternalID 615084 | | 1 615086 | PartyInternalID 615088 |
| | | | | Formatted-Name 615090 | | 0..1 615092 | LONG_Name, Qualifier: Party-Formatted 615094 |
| | | | BillTo-Party 615096 | | | 0..1 615098 | |
| | | | | InternalID 6150100 | | 1 6150102 | PartyInternalID 6150104 |

FIG. 615-4

| Package | level 1 | level 2 | level 3 | level 4 | level 5 | Cardinality | Datatype Name |
|---|---|---|---|---|---|---|---|
| | | | | Formatted-Name 6150106 | | 0..1 6150108 | LONG_Name, Qualifier: Party-Formatted 6150110 |
| | | | Payer-Party 6150112 | | | 0..1 6150114 | |
| | | | | InternalID 6150116 | | 1 6150118 | PartyInternalID 6150120 |
| | | | | Formatted-Name 6150122 | | 0..1 6150124 | LONG_Name, Qualifier: Party-Formatted 6150126 |
| | | | Responsi-bleEmployeeParty 6150128 | | | 0..1 6150130 | |
| | | | | InternalID 6150132 | | 1 6150134 | PartyInternalID 6150136 |

FIG. 615-5

| Package | level 1 | level 2 | level 3 | level 4 | level 5 | Cardinality | Datatype Name |
|---|---|---|---|---|---|---|---|
| | | | | Formatted-Name 6150138 | | 0..1 6150140 | LANGUAGEINDEPENDENT_LONG_Name, Qualifier: Per-sonFormatted 6150142 |
| | | | SalesOr-ganisa-tionParty 6150144 | | | 1 6150146 | |
| | | | | InternalID 6150148 | | 1 6150150 | PartyInternalID 6150152 |
| SalesTerms 6150154 | | | Sales-Terms 6150156 | | | 0..1 6150158 | |
| | | | | Distribution-Channel-Code 6150160 | | 0..1 6150162 | Distribution-ChannelCode 6150164 |
| | | | | Division-Code 6150166 | | 0..1 6150168 | DivisionCode 6150170 |

FIG. 615-6

| Package | level 1 | level 2 | level 3 | level 4 | level 5 | Cardinality | Datatype Name |
|---|---|---|---|---|---|---|---|
| DateTerms 6150172 | | | DateTerms 6150174 | | | 0..1 6150176 | |
| | | | | RequestDate 6150178 | | 0..1 6150180 | Date 6150182 |
| PricingTerms 6150184 | | | Pricing-Terms 6150186 | | | 0..1 6150188 | |
| | | | | Currency-Code 6150190 | | 0..1 6150192 | CurrencyCode 6150194 |
| | | | | PriceDetermination-Date 6150196 | | 0..1 6150198 | Date 6150200 |
| TotalValues 6150202 | | | TotalValues 6150204 | | | 0..1 6150206 | |
| | | | | GrossWeight Measure 6150208 | | 0..1 6150210 | Measure 6150212 |

FIG. 615-7

| Package | level 1 | level 2 | level 3 | level 4 | level 5 | Cardinality | Datatype Name |
|---|---|---|---|---|---|---|---|
| | | | | NetAmount 6150214 | | 0..1 6150216 | Amount 6150218 |
| DeliveryTerms 6150220 | | | Delivery-Terms 6150222 | | | 0..1 6150224 | |
| | | | | Incoterms 6150226 | | 0..1 6150228 | Incoterms 6150230 |
| | | | | PartialDeliv-eryControl-Code 6150232 | | 0..1 6150234 | PartialDelivery-ControlCode 6150236 |
| InvoiceTerms 6150238 | | | In-voiceTerm s 6150240 | | | 0..1 6150242 | |
| | | | | Invoicing-Date 6150244 | | 0..1 6150246 | Date 6150248 |
| Item 6150250 | | | Item 6150252 | | | 0..N 6150254 | |

FIG. 615-8

| Package | level 1 | level 2 | level 3 | level 4 | level 5 | Cardinality | Datatype Name |
|---|---|---|---|---|---|---|---|
| | | | | ID 6150256 | | 1 6150258 | SalesOrde-rItemID 6150260 |
| | | | | Description 6150262 | | 0..1 6150264 | SHORT_Description 6150266 |
| | | | | Cancella-tionReason-Code 6150268 | | 0..1 6150270 | Cancellation-ReasonCode 6150272 |
| | | | | Invoic-ingBlockin-gReason-Code 6150274 | | 0..1 6150276 | BlockingRea-sonCode 6150278 |
| ProductIn-formation 6150280 | | | | Product 6150282 | | 0..1 6150284 | |
| | | | | | SellerID 6150286 | 1 6150288 | ProductPartyID 6150290 |
| Party 6150292 | | | | BuyerParty 6150294 | | 0..1 6150296 | |

FIG. 615-9

| Package | level 1 | level 2 | level 3 | level 4 | level 5 | Cardinality | Datatype Name |
|---|---|---|---|---|---|---|---|
| | | | | | InternalID 6150298 | 1 6150300 | PartyInternalID 6150302 |
| | | | | | Formatted-Name 6150304 | 0..1 6150306 | LONG_Name, Qualifier: Party-Formatted 6150308 |
| | | | | GoodsRe-cipientParty 6150310 | | 0..1 6150312 | |
| | | | | | InternalID 6150314 | 1 6150316 | PartyInternalID 6150318 |
| | | | | | Formatted-Name 6150320 | 0..1 6150322 | LONG_Name, Qualifier: Party-Formatted 6150324 |
| | | | | BillToParty 6150326 | | 0..1 6150328 | |
| | | | | | InternalID 6150330 | 1 6150332 | PartyInternalID 6150334 |

FIG. 615-10

| Package | level 1 | level 2 | level 3 | level 4 | level 5 | Cardinality | Datatype Name |
|---|---|---|---|---|---|---|---|
| | | | | | Formatted-Name 6150336 | 0..1 6150338 | LONG_Name, Qualifier: Party-Formatted 6150340 |
| | | | | PayerParty 6150342 | | 0..1 6150344 | |
| | | | | | InternalID 6150346 | 1 6150348 | PartyInternalID 6150350 |
| | | | | | Formatted-Name 6150352 | 0..1 6150354 | LONG_Name, Qualifier: Party-Formatted 6150356 |
| | | | | Responsi-bleEmploy-eeParty 6150358 | | 0..1 6150360 | |
| | | | | | InternalID 6150362 | 1 6150364 | PartyInternalID 6150366 |

FIG. 615-11

| Package | level 1 | level 2 | level 3 | level 4 | level 5 | Cardinality | Datatype Name |
|---|---|---|---|---|---|---|---|
| SalesTerms 6150384 | | | | | Formatted-Name 6150368 | 0..1 6150370 | LANGUAGEINDEPENDENT_LONG_Name, Qualifier: Per-sonFormatted 6150372 |
| | | | | SalesOr-ganisation-Party 6150374 | | 0..1 6150376 | |
| | | | | | InternalID 6150378 | 1 6150380 | PartyPartyID 6150382 |
| | | | | SalesTerms 6150386 | | 0..1 6150388 | |
| | | | | | Distribution-ChannelCode 6150390 | 0..1 6150392 | Distribution-ChannelCode 6150394 |
| | | | | | DivisionCode 6150396 | 0..1 6150398 | DivisionCode 6150400 |

FIG. 615-12

| Package | level 1 | level 2 | level 3 | level 4 | level 5 | Cardinality | Datatype Name |
|---|---|---|---|---|---|---|---|
| Delivery-Terms 6150402 | | | | Delivery-Terms 6150404 | | 0..1 6150406 | |
| | | | | | PriorityValue 6150408 | 0..1 6150410 | PriorityValue 6150412 |
| | | | | | Incoterms 6150414 | 0..1 6150416 | Incoterms 6150418 |
| In-voiceTerms 6150420 | | | | In-voiceTerms 6150422 | | 0..1 6150424 | |
| | | | | | InvoiceDate 6150426 | 0..1 6150428 | Date 6150430 |
| TotalValues 6150432 | | | | TotalValues 6150434 | | 0..1 6150436 | |
| | | | | | Requested-Quantity 6150438 | 0..1 6150440 | Quantity 6150442 |
| | | | | | Confirmed-Quantity 6150444 | 0..1 6150446 | Quantity 6150448 |

FIG. 615-13

| Package | level 1 | level 2 | level 3 | level 4 | level 5 | Cardinality | Datatype Name |
|---|---|---|---|---|---|---|---|
| | | | | | GrossWeight-Measure 6150450 | 0..1 6150452 | Measure 6150454 |
| | | | | | NetWeight-Measure 6150456 | 0..1 6150458 | Measure 6150460 |
| | | | | | Volume-Measure 6150462 | 0..1 6150464 | Measure 6150466 |
| | | | | | NetAmount 6150468 | 0..1 6150470 | Amount 6150472 |
| | | | | | NetPrice 6150474 | 0..1 6150476 | Price 6150478 |
| Sched-uleLine 6150480 | | | | Sched-uleLine 6150482 | | 0..N 6150484 | |
| | | | | | ID 6150486 | 1 6150488 | BusinessTrans-actionDocumen-tItemSched-uleLineID 6150490 |

FIG. 615-14

| Package | level 1 | level 2 | level 3 | level 4 | level 5 | Cardinality | Datatype Name |
|---|---|---|---|---|---|---|---|
| | | | | | Date 6150492 | 0..1 6150494 | Date 6150496 |
| | | | | | Requested-Quantity 6150498 | 0..1 6150500 | Quantity 6150502 |
| | | | | | Confirmed-Quantity 6150504 | 0..1 6150506 | Quantity 6150508 |
| | | | | | Delivery-BlockingRea-sonCode 6150510 | 0..1 6150512 | BlockingRea-sonCode 6150514 |
| | | | | | ReceiptTime 6150516 | 0..1 6150518 | Time 6150520 |
| Log 6150522 | | Log 6150524 | | | | 1 6150526 | Log 6150528 |

FIG. 616

| Package | level 1 | level 2 | level 3 | Cardinality | Datatype Name |
|---|---|---|---|---|---|
| SalesOrderCreateConfirmationMessage_sync 616000 | SalesOrderCreateConfirmationMessage_sync 616002 | | | | SalesOrderCreateConfirmationMessage_sync 616004 |
| | | | ID 616006 | 1 616008 | BusinessDocumentMessageID 616010 |
| | | | CreationDateTime 616012 | 1 616014 | DateTime 616016 |
| | | | ... | 0..1 | ... |
| SalesOrder 616020 | | SalesOrder 616022 | | 0..1 616024 | |
| | | | ID 616026 | 1 616028 | SalesOrderID 616030 |
| Log 616032 | | Log 616034 | | 1 616036 | Log 616038 |

FIG. 617-1

| Package | level 1 | level 2 | level 3 | level 4 | level 5 | Cardinality | Datatype Name |
|---|---|---|---|---|---|---|---|
| SalesOrderCreateRequest-Message_sync 617000 | SalesOrderCreateRequestMessage_sync 617002 | | | | | | SalesOrderCreateRequest-Message_sync 617004 |
| | | | ID 617006 | | | 1 617008 | BusinessDocumentMessageID 617010 |
| | | | CreationDateTime 617012 | | | 1 617014 | DateTime 617016 |
| | | | ... | | | 0..1 | ... |
| SalesOrder 617020 | | SalesOrder 617022 | | | | 1 617024 | |
| | | | Date 617026 | | | 0..1 617028 | Date 617030 |
| | | | ProcessingTypeCode 617032 | | | 1 617034 | BusinessTransactionDocumentProcessingTypeCode 617036 |

FIG. 617-2

| Package | level 1 | level 2 | level 3 | level 4 | level 5 | Cardinality | Datatype Name |
|---|---|---|---|---|---|---|---|
| | | | BuyerID 617038 | | | 0..1 617040 | BusinessTransactionDocumentID 617042 |
| Party 617044 | | | Buyer-Party 617046 | | | 1 617048 | |
| | | | | InternalID 617050 | | 1 617052 | PartyInternalID 617054 |
| | | | SalesOr-ganisa-tionParty 617056 | | | 1 617058 | |
| | | | | InternalID 617060 | | 1 617062 | PartyInternalID 617064 |
| SalesTerms 617066 | | | Sales-Terms 617068 | | | 1 617070 | |
| | | | | Distribu-tionChan-nelCode 617072 | | 1 617074 | DistributionChannelCode 617076 |

FIG. 617-3

| Package | level 1 | level 2 | level 3 | level 4 | level 5 | Cardinality | Datatype Name |
|---|---|---|---|---|---|---|---|
| | | | | Division-Code 617078 | | 1 617080 | DivisionCode 617082 |
| DateTerms 617084 | | | DateTerms 617086 | | | 0..1 617088 | |
| | | | | Request-Date 617090 | | 0..1 617092 | Date 617094 |
| Item 617096 | | | Item 617098 | | | 0..N 6170100 | |
| Product-Information 6170102 | | | | Product 6170104 | | 1 6170106 | |
| | | | | | SellerID 6170108 | 1 6170110 | ProductPartyID 6170112 |
| TotalValues 6170114 | | | | TotalValues 6170116 | | 1 6170118 | |
| | | | | | RequestedQuantity 6170120 | 1 6170122 | Quantity 6170124 |

FIG. 618

| Package | level 1 | level 2 | level 3 | Cardinality | Datatype Name |
|---|---|---|---|---|---|
| SalesOrderItem-ByAccountAs-signmentQuery-Message_sync 618000 | SalesOrderItem-ByAccountAssign-mentQueryMes-sage_sync 618002 | | | | SalesOrderItemByAccountAs-signmentQueryMessage_sync 618004 |
| | | | ID 618006 | 1 618008 | BusinessDocumentMessageID 618010 |
| | | | CreationDateTime 618012 | 1 618014 | DateTime 618016 |
| | | | ... | 0..1 | ... |
| Selection 618020 | | SalesOrde-rItemSelec-tionByAccoun-tAssignment 618022 | | 1 618024 | |
| | | | SalesOrderItemAccou ntAssignmentPro-jectWorkBreakdown-StructureElementID 618026 | 1 618028 | ProjectWorkBreakdownStructu-reElementID 618030 |

FIG. 619-1

| Package | level 1 | level 2 | level 3 | level 4 | level 5 | Cardinality | Datatype Name |
|---|---|---|---|---|---|---|---|
| SalesOrderMessage 619000 | SalesOrderMessage 619002 | | | | | | SalesOrderItemByAccountAssignmentResponseMessage_sync 619004 |
| | | | ID 619006 | | | 1 619008 | BusinessDocumentMessageID 619010 |
| | | | CreationDateTime 619012 | | | 1 619014 | DateTime 619016 |
| | | | ... | | | 0..1 | ... |
| SalesOrder 619020 | | SalesOrder 619022 | | | | 0..N 619024 | |
| | | | ID 619026 | | | 1 619028 | SalesOrderID 619030 |
| | | | Date 619032 | | | 0..1 619034 | Date 619036 |
| | | | BuyerID 619038 | | | 0..1 619040 | BusinessTransactionDocumentID 619042 |

FIG. 619-2

| Package | level 1 | level 2 | level 3 | level 4 | level 5 | Cardinality | Datatype Name |
|---|---|---|---|---|---|---|---|
| Party 619044 | | | BuyerParty 619046 | | | 1 619048 | |
| | | | | InternalID 619050 | | 1 619052 | PartyInternalID 619054 |
| | | | | Format-tedName 619056 | | 0..1 619058 | LONG_Name, Qualifier: PartyFormatted 619060 |
| | | | SalesOr-ganisa-tionParty 619062 | | | 1 619064 | |
| | | | | InternalID 619066 | | 1 619068 | PartyInternalID 619070 |
| SalesTerms 619072 | | | Sales-Terms 619074 | | | 1 619076 | |
| | | | | Distribu-tionChan-nelCode 619078 | | 1 619080 | DistributionChannel-Code 619082 |

FIG. 619-3

| Package | level 1 | level 2 | level 3 | level 4 | level 5 | Cardinality | Datatype Name |
|---|---|---|---|---|---|---|---|
| | | | | Division-Code 619084 | | 1 619086 | DivisionCode 619088 |
| PricingTerms 619090 | | | Pricing-Terms 619092 | | | 0..1 619094 | |
| | | | | Currency-Code 619096 | | 0..1 619098 | CurrencyCode 6190100 |
| Item 6190102 | | | Item 6190104 | | | 1..N 6190106 | |
| | | | | ID 6190108 | | 1 6190110 | SalesOrderItemID 6190112 |
| | | | | Description 6190114 | | 0..1 6190116 | SHORT_Description 6190118 |
| ProductIn-formation 6190120 | | | | Product 6190122 | | 0..1 6190124 | |
| | | | | | SellerID 6190126 | 1 6190128 | ProductPartyID 6190130 |

FIG. 619-4

| Package | level 1 | level 2 | level 3 | level 4 | level 5 | Cardinality | Datatype Name |
|---|---|---|---|---|---|---|---|
| AccountAssignment 6190132 | | | | AccountAssignment 6190134 | | 1 6190136 | |
| | | | | | ProjectWorkBreakdownStructureElementID 6190138 | 1 6190140 | ProjectWorkBreakdownStructureElementID 6190142 |
| TotalValues 6190144 | | | | TotalValues 6190146 | | 0..1 6190148 | |
| | | | | | RequestedQuantity 6190150 | 0..1 6190152 | Quantity 6190154 |
| | | | | | NetAmount 6190156 | 0..1 6190158 | Amount 6190160 |
| Log 6190162 | | Log 6190164 | | | | 1 6190166 | Log 6190168 |

FIG. 620-1

| Package | level 1 | level 2 | level 3 | Cardinality | Datatype Name |
|---|---|---|---|---|---|
| SalesOrderItemBy-BuyerAndProductQue-ryMessage_sync 620000 | SalesOrderItemBy-BuyerAndProduc-tQueryMessage_sync 620002 | | | | SalesOrderItemByBuyerAnd-ProductQueryMessage_sync 620004 |
| | | | ID 620006 | 1 620008 | BusinessDocumentMessageID 620010 |
| | | | CreationDateTime 620012 | 1 620014 | DateTime 620016 |
| | | | ... | 0..1 | ... |
| Selection 620020 | | SalesOrde-rItemSelec-tionBy-BuyerAnd-Product 620022 | | 1 620024 | |
| | | | SalesOrderBuyer-PartyInternalID 620026 | 1 620028 | PartyInternalID 620030 |

FIG. 620-2

| Package | level 1 | level 2 | level 3 | Cardinality | Datatype Name |
|---|---|---|---|---|---|
| | | | SalesOrderSale-sOrganisation-PartyInternalID 620032 | 1 620034 | PartyInternalID 620036 |
| | | | SalesOrderItem-ProductSellerID 620038 | 1 620040 | ProductPartyID 620042 |

FIG. 621-1

| Package | level 1 | level 2 | level 3 | level 4 | level 5 | Cardinality | Datatype Name |
|---|---|---|---|---|---|---|---|
| SalesOrderItemBy-BuyerAndProduc-tResponseMes-sage_sync 621000 | SalesOrderItemBy-BuyerAndProduc-tResponseMes-sage_sync 621002 | | | | | | SalesOrderItem-ByBuyerAndPro-ductResponse-Message_sync 621004 |
| | | | ID 621006 | | | 1 621008 | BusinessDocu-mentMessageID 621010 |
| | | | Creation-DateTime 621012 | | | 1 621014 | DateTime 621016 |
| | | | ... | | | 0..1 | ... |
| SalesOrder 621020 | | SalesOrder 621022 | | | | 0..N 621024 | |
| | | | ID 621026 | | | 1 621028 | SalesOrderID 621030 |
| | | | Date 621032 | | | 0..1 621034 | Date 621036 |
| | | | BuyerID 621038 | | | 0..1 621040 | BusinessTransac-tionDocumentID 621042 |

FIG. 621-2

| Package | level 1 | level 2 | level 3 | level 4 | level 5 | Cardinality | Datatype Name |
|---|---|---|---|---|---|---|---|
| Party 621044 | | | BuyerParty 621046 | | | 1 621048 | |
| | | | | InternalID 621050 | | 1 621052 | PartyInternalID 621054 |
| | | | | Format-tedName 621056 | | 0..1 621058 | LONG_Name, Qualifier: Party-Formatted 621060 |
| | | | SalesOr-ganisation-Party 621062 | | | 1 621064 | |
| | | | | InternalID 621066 | | 1 621068 | PartyInternalID 621070 |
| SalesTerms 621072 | | | SalesTerms 621074 | | | 1 621076 | |
| | | | | Distribu-tionChan-nelCode 621078 | | 1 621080 | DistributionChan-nelCode 621082 |
| | | | | Division-Code 621084 | | 1 621086 | DivisionCode 621088 |

FIG. 621-3

| Package | level 1 | level 2 | level 3 | level 4 | level 5 | Cardinality | Datatype Name |
|---|---|---|---|---|---|---|---|
| PricingTerms 621090 | | | Pricing-Terms 621092 | | | 0..1 621094 | |
| | | | | Currency-Code 621096 | | 0..1 621098 | CurrencyCode 6210100 |
| Item 6210102 | | | Item 6210104 | | | 1..N 6210106 | |
| | | | | ID 6210108 | | 1 6210110 | SalesOrderItemID 6210112 |
| | | | | Description 6210114 | | 0..1 6210116 | SHORT_Description 6210118 |
| ProductIn-formation 6210120 | | | | Product 6210122 | | 1 6210124 | |
| | | | | | SellerID 6210126 | 1 6210128 | ProductPartyID 6210130 |
| TotalValues 6210132 | | | | TotalVal-ues 6210134 | | 0..1 6210136 | |

FIG. 621-4

| Package | level 1 | level 2 | level 3 | level 4 | level 5 | Cardinality | Datatype Name |
|---|---|---|---|---|---|---|---|
| | | | | | Request-edQuantity 6210138 | 0..1 6210140 | Quantity 6210142 |
| | | | | | NetAmount 6210144 | 0..1 6210146 | Amount 6210148 |
| Log 6210150 | | Log 6210152 | | | | 1 6210154 | Log 6210156 |

FIG. 622

| Package | level 1 | level 2 | level 3 | Cardinality | Datatype Name |
|---|---|---|---|---|---|
| SalesOrderItemBy-IDQueryMes-sage_sync 622000 | SalesOrderItemByID-QueryMessage_sync 622002 | | | | SalesOrderItemByIDQueryMes-sage_sync 622004 |
| | | | ID 622006 | 1 622008 | BusinessDocumentMessageID 622010 |
| | | | Creation-DateTime 622012 | 1 622014 | DateTime 622016 |
| | | | ... | 0..1 | ... |
| Selection 622020 | | SalesOrde-rItemSelec-tionByID 622022 | | 1 622024 | |
| | | | SalesOrderID 622026 | 1 622028 | SalesOrderID 622030 |
| | | | SalesOrde-rItemID 622032 | 1 622034 | SalesOrderItemID 622036 |

FIG. 623-1

| Package | level 1 | level 2 | level 3 | level 4 | level 5 | Cardinality | Datatype Name |
|---|---|---|---|---|---|---|---|
| SalesOrderItemBy-IDResponseMes-sage_sync 623000 | SalesOrde-rItemBy-IDRespon-seMes-sage_sync 623002 | | | | | | SalesOrderItemBy-IDResponseMes-sage_sync 623004 |
| | | | ID 623006 | | | 1 623008 | BusinessDocument-MessageID 623010 |
| | | | Creation-DateTime 623012 | | | 1 623014 | DateTime 623016 |
| | | | ... | | | 0..1 | ... |
| SalesOrder 623020 | | SalesOrder 623022 | | | | 0..1 623024 | |
| | | | ID 623026 | | | 1 623028 | SalesOrderID 623030 |
| Party 623032 | | | Buyer-Party 623034 | | | 1 623036 | |

FIG. 623-2

| Package | level 1 | level 2 | level 3 | level 4 | level 5 | Cardinality | Datatype Name |
|---|---|---|---|---|---|---|---|
| | | | | InternalID 623038 | | 1 623040 | PartyInternalID 623042 |
| | | | | Formatted-Name 623044 | | 0..1 623046 | LONG_Name, Qualifier: PartyFormatted 623048 |
| Party 623050 | | | SalesOr-ganisa-tionParty 623052 | | | 1 623054 | |
| | | | | InternalID 623056 | | 1 623058 | PartyInternalID 623060 |
| SalesTerms 623062 | | | Sales-Terms 623064 | | | 0..1 623066 | |
| | | | | Distribution-Channel-Code 623068 | | 0..1 623070 | DistributionChannel-Code 623072 |
| | | | | Division-Code 623074 | | 0..1 623076 | DivisionCode 623078 |

FIG. 623-3

| Package | level 1 | level 2 | level 3 | level 4 | level 5 | Cardinality | Datatype Name |
|---|---|---|---|---|---|---|---|
| DateTerms 623080 | | | DateTerms 623082 | | | 0..1 623084 | |
| | | | | RequestDate 623086 | | 0..1 623088 | Date 623090 |
| Item 623092 | | | Item 623094 | | | 0..1 623096 | |
| | 60 623098 | | | ID 6230100 | | 1 6230102 | SalesOrderItemID 6230104 |
| | | | | Description 6230106 | | 0..1 6230108 | SHORT_Description 6230110 |
| ProductIn-formation 6230112 | | | | Product 6230114 | | 0..1 6230116 | |
| | | | | | SellerID 6230118 | 1 6230120 | ProductPartyID 6230122 |
| Delivery-Terms 6230124 | | | | Delivery-Terms 6230126 | | 0..1 6230128 | |

FIG. 623-4

| Package | level 1 | level 2 | level 3 | level 4 | level 5 | Cardinality | Datatype Name |
|---|---|---|---|---|---|---|---|
| | | | | | Deliv-eryPriori-tyValue 6230130 | 0..1 6230132 | PriorityValue 6230134 |
| | | | | | Incoterms 6230136 | 0..1 6230138 | Incoterms 6230140 |
| TotalVal-ues 6230142 | | | | TotalValues 6230144 | | 0..1 6230146 | |
| | | | | | Request-edQuantity 6230148 | 0..1 6230150 | Quantity 6230152 |
| | | | | | Con-firmedQua ntity 6230154 | 0..1 6230156 | Quantity 6230158 |
| | | | | | GrossWeig htMeasure 6230160 | 0..1 6230162 | Measure 6230164 |
| | | | | | Net-WeightMea sure 6230166 | 0..1 6230168 | Measure 6230170 |

FIG. 623-5

| Package | level 1 | level 2 | level 3 | level 4 | level 5 | Cardinality | Datatype Name |
|---|---|---|---|---|---|---|---|
| | | | | | Volume-Measure 6230172 | 0..1 6230174 | Measure 6230176 |
| | | | | | NetAmount 6230178 | 0..1 6230180 | Amount 6230182 |
| | | | | | NetPrice 6230184 | 0..1 6230186 | Price 6230188 |
| Log 6230190 | | Log 6230192 | | | | 1 6230194 | Log 6230196 |

FIG. 624-1

| Package | level 1 | level 2 | level 3 | level 4 | level 5 | Cardinality | Datatype Name |
|---|---|---|---|---|---|---|---|
| SalesOrderItem-ScheduleLine-ChangeConfirmationMessage_sync 624000 | SalesOrderItem-ScheduleLine-ChangeConfirmationMessage_sync 624002 | | | | | | SalesOrderItemScheduleLineChangeConfirmationMessage_sync 624004 |
| | | | ID 624006 | | | 1 624008 | BusinessDocumentMessageID 624010 |
| | | | Creation-DateTime 624012 | | | 1 624014 | DateTime 624016 |
| | | | ... | | | 0..1 | ... |
| SalesOrder 624020 | | SalesOrder 624022 | | | | 0..1 624024 | |
| | | | ID 624026 | | | 1 624028 | SalesOrdertID 624030 |
| Item 624032 | | | Item 624034 | | | 0..1 624036 | |

FIG. 624-2

| Package | level 1 | level 2 | level 3 | level 4 | level 5 | Cardinality | Datatype Name |
|---|---|---|---|---|---|---|---|
| | | | | | | | |
| | | | | ID 624038 | | 1 624040 | SalesOrderItemID 624042 |
| ScheduleLine 624044 | | | | ScheduleLine 624046 | | 0..1 624048 | |
| | | | | | ID 624050 | 1 624052 | BusinessTransactionDocumentItemScheduleLineID 624054 |
| Log 624056 | | Log 624058 | | | | 1 624060 | Log 624062 |

FIG. 625-1

| Package | level 1 | level 2 | level 3 | level 4 | level 5 | Cardinality | Datatype Name |
|---|---|---|---|---|---|---|---|
| SalesOrderItem-ScheduleLine-ChangeRequest-Message_sync 625000 | SalesOrderItem-ScheduleLine-ChangeRequest-Message_sync 625002 | | | | | | SalesOrderItemSched-uleLineChangeRe-questMessage_sync 625004 |
| | | | ID 625006 | | | 1 625008 | BusinessDocumentMes-sageID 625010 |
| | | | Creation-DateTime 625012 | | | 1 625014 | DateTime 625016 |
| | | | ... | | | 0..1 | ... |
| SalesOrder 625020 | | SalesOrder 625022 | | | | 1 625024 | |
| | | | ID 625026 | | | 1 625028 | SalesOrderID 625030 |
| Item 625032 | | | Item 625034 | | | 1 625036 | |
| | | | | ID 625038 | | 1 625040 | SalesOrderItemID 625042 |

FIG. 625-2

| Package | level 1 | level 2 | level 3 | level 4 | level 5 | Cardinality | Datatype Name |
|---|---|---|---|---|---|---|---|
| ScheduleLine 625044 | | | | ScheduleLine 625046 | | 1 625048 | |
| | | | | | ID 625050 | 1 625052 | BusinessTransactionDocumentItemScheduleLineID 625054 |
| | | | | | Date 625056 | 0..1 625058 | Date 625060 |
| | | | | | RequestedQuantity 625062 | 0..1 625064 | Quantity 625066 |
| | | | | | DeliveryBlockingReasonCode 625068 | 0..1 625070 | BlockingReasonCode 625072 |

FIG. 626-1

| Package | level 1 | level 2 | level 3 | level 4 | level 5 | Cardinality | Datatype Name |
|---|---|---|---|---|---|---|---|
| SalesOrderMessage 626000 | SalesOrderMessage 626002 | | | | | | SalesOrderMessage 626004 |
| | | | ID 626006 | | | 1 626008 | BusinessDocumentMessageID 626010 |
| | | | CreationDateTime 626012 | | | 1 626014 | DateTime 626016 |
| | | | ... | | | 0..1 | ... |
| SalesOrder 626020 | | SalesOrder 626022 | | | | 0..N 626024 | |
| | | | ID 626026 | | | 1 626028 | SalesOrderID 626030 |
| | | | Date 626032 | | | 0..1 626034 | Date 626036 |

FIG. 626-2

| Package | level 1 | level 2 | level 3 | level 4 | level 5 | Cardinality | Datatype Name |
|---|---|---|---|---|---|---|---|
| | | | Process-ingType-Code 626038 | | | 1 626040 | BusinessTransactionDocu-mentProcessingTypeCode 626042 |
| | | | BuyerID 626044 | | | 0..1 626046 | BusinessTransactionDocu-mentID 626048 |
| | | | Delivery-Blockin-gRea-sonCode 626050 | | | 0..1 626052 | BlockingReasonCode 626054 |
| | | | Invoice-Blockin-gRea-sonCode 626056 | | | 0..1 626058 | BlockingReasonCode 626060 |
| Party 626062 | | | Buyer-Party 626064 | | | 1 626066 | |
| | | | | InternalID 626068 | | 1 626070 | PartyInternalID 626072 |

FIG. 626-3

| Package | level 1 | level 2 | level 3 | level 4 | level 5 | Cardinality | Datatype Name |
|---|---|---|---|---|---|---|---|
| | | | | Format-tedName 626074 | | 0..1 626076 | LONG_Name, Qualifier: Par-tyFormatted 626078 |
| | | | Goods-Recipi-entParty 626080 | | | 0..1 626082 | |
| | | | | InternalID 626084 | | 1 626086 | PartyInternalID 626088 |
| | | | | Format-tedName 626090 | | 0..1 626092 | LONG_Name, Qualifier: Par-tyFormatted 626094 |
| | | | BillTo-Party 626096 | | | 0..1 626098 | |
| | | | | InternalID 6260100 | | 1 6260102 | PartyInternalID 6260104 |
| | | | | Format-tedName 6260106 | | 0..1 6260108 | LONG_Name, Qualifier: Par-tyFormatted 6260110 |

FIG. 626-4

| Package | level 1 | level 2 | level 3 | level 4 | level 5 | Cardinality | Datatype Name |
|---|---|---|---|---|---|---|---|
| | | | Payer-Party 6260112 | | | 0..1 6260114 | |
| | | | | InternalID 6260116 | | 1 6260118 | PartyInternalID 6260120 |
| | | | | Format-tedName 6260122 | | 0..1 6260124 | LONG_Name, Qualifier: Par-tyFormatted 6260126 |
| | | | Respon-sibleEm-ploy-eeParty 6260128 | | | 0..1 6260130 | |
| | | | | InternalID 6260132 | | 1 6260134 | PartyInternalID 6260136 |
| | | | | Format-tedName 6260138 | | 0..1 6260140 | LANGUAGEINDEPENDENT_ LONG_Name, Qualifier: Per-sonFormatted 6260142 |

FIG. 626-5

| Package | level 1 | level 2 | level 3 | level 4 | level 5 | Cardinality | Datatype Name |
|---|---|---|---|---|---|---|---|
| | | | SalesOr-ganisa-tionParty 6260144 | | | 1 6260146 | |
| | | | | InternalID 6260148 | | 1 6260150 | PartyInternalID 6260152 |
| SalesTerms 6260154 | | | Sales-Terms 6260156 | | | 1 6260158 | |
| | | | | Distribu-tionChan-nelCode 6260160 | | 1 6260162 | DistributionChannelCode 6260164 |
| | | | | Division-Code 6260166 | | 1 6260168 | DivisionCode 6260170 |
| DateTerms 6260172 | | | DateTer ms 6260174 | | | 1 6260176 | |
| | | | | Request-Date 6260178 | | 0..1 6260180 | Date 6260182 |

FIG. 626-6

| Package | level 1 | level 2 | level 3 | level 4 | level 5 | Cardinality | Datatype Name |
|---|---|---|---|---|---|---|---|
| PricingTerms 6260184 | | | Pricing-Terms 6260186 | | | 1 6260188 | |
| | | | | Cur-rencyCode 6260190 | | 1 6260192 | CurrencyCode 6260194 |
| | | | | PriceDe-termina-tionDate 6260196 | | 1 6260198 | DateTime 6260200 |
| TotalValues 6260202 | | | TotalVal-ues 6260204 | | | 0..1 6260206 | |
| | | | | GrossWeightMeas-ure 6260208 | | 0..1 6260210 | Measure 6260212 |
| | | | | NetA-mount 6260214 | | 0..1 6260216 | Amount 6260218 |

FIG. 626-7

| Package | level 1 | level 2 | level 3 | level 4 | level 5 | Cardinality | Datatype Name |
|---|---|---|---|---|---|---|---|
| Delivery-Terms 6260220 | | | Delivery-Terms 6260222 | | | | |
| | | | | Incoterms 6260224 | | 0..1 6260226 | Incoterms 6260228 |
| | | | | PartialDe-liveryCon-trolCode 6260230 | | 0..1 6260232 | PartialDeliveryControlCode 6260234 |
| InvoiceTerms 6260236 | | | In-voiceTer ms 6260238 | | | | |
| | | | | Invoicing-Date 6260240 | | 0..1 6260242 | Date 6260244 |
| Item 6260246 | | | Item 6260248 | | | 0..1 6260250 | |
| | | | | ID 6260252 | | 1 6260254 | SalesOrderItemID 6260256 |

FIG. 626-8

| Package | level 1 | level 2 | level 3 | level 4 | level 5 | Cardinality | Datatype Name |
|---|---|---|---|---|---|---|---|
| | | | | Description 6260258 | | 0..1 6260260 | SHORT_Description 6260262 |
| | | | | CancellationReasonCode 6260264 | | 0..1 6260266 | CancellationReasonCode 6260268 |
| | | | | InvoicingBlockingReasonCode 6260270 | | 0..1 6260272 | BlockingReasonCode 6260274 |
| ProductInformation 6260276 | | | | Product 6260278 | | 0..1 6260280 | |
| | | | | | SellerID 6260282 | 1 6260284 | ProductPartyID 6260286 |
| Party 6260288 | | | | BuyerParty 6260290 | | 0..1 6260292 | |
| | | | | | InternalID 6260294 | 1 6260296 | PartyInternalID 6260298 |

FIG. 626-9

| Package | level 1 | level 2 | level 3 | level 4 | level 5 | Cardinality | Datatype Name |
|---|---|---|---|---|---|---|---|
| | | | | | Formatted-Name 6260300 | 0..1 6260302 | LONG_Name, Qualifier: PartyFormatted 6260304 |
| | | | | GoodsRecipient-Party 6260306 | | 0..1 6260308 | |
| | | | | | InternalID 6260310 | 1 6260312 | PartyInternalID 6260314 |
| | | | | | Formatted-Name 6260316 | 0..1 6260318 | LONG_Name, Qualifier: PartyFormatted 6260320 |
| | | | | BillTo-Party 6260322 | | 0..1 6260324 | |
| | | | | | InternalID 6260326 | 1 6260328 | PartyInternalID 6260330 |
| | | | | | Formatted-Name 6260332 | 0..1 6260334 | LONG_Name, Qualifier: PartyFormatted 6260336 |

FIG. 626-10

| Package | level 1 | level 2 | level 3 | level 4 | level 5 | Cardinality | Datatype Name |
|---|---|---|---|---|---|---|---|
| | | | | Payer-Party 6260338 | | 0..1 6260340 | |
| | | | | | InternalID 6260342 | 1 6260344 | PartyInternalID 6260346 |
| | | | | | Formatted-Name 6260348 | 0..1 6260350 | LONG_Name, Qualifier: Par-tyFormatted 6260352 |
| | | | | Respon-sibleEm-ploy-eeParty 6260354 | | 0..1 6260356 | |
| | | | | | InternalID 6260358 | 1 6260360 | PartyInternalID 6260362 |
| | | | | | Formatted-Name 6260364 | 0..1 6260366 | LANGUAGEINDEPENDENT_LONG_Name, Qualifier: Per-sonFormatted 6260368 |

FIG. 626-11

| Package | level 1 | level 2 | level 3 | level 4 | level 5 | Cardinality | Datatype Name |
|---|---|---|---|---|---|---|---|
| | | | | SalesOrganisationParty 6260370 | | 0..1 6260372 | |
| | | | | | InternalID 6260374 | 1 6260376 | PartyInternalID 6260378 |
| Location 6260380 | | | | ShipToLocation 6260382 | | 0..1 6260384 | |
| | | | | | BuyerID 6260386 | 0..1 6260388 | LocationPartyID 6260390 |
| SalesTerms 6260392 | | | | SalesTerms 6260394 | | 0..1 6260396 | |
| | | | | | DistributionChannelCode 6260398 | 1 6260400 | DistributionChannelCode 6260402 |
| | | | | | DivisionCode 6260404 | 1 6260406 | DivisionCode 6260408 |

FIG. 626-12

| Package | level 1 | level 2 | level 3 | level 4 | level 5 | Cardinality | Datatype Name |
|---|---|---|---|---|---|---|---|
| Delivery-Terms 6260410 | | | | Delivery-Terms 6260412 | | 0..1 6260414 | |
| | | | | | Priority-Value 6260416 | 0..1 6260418 | PriorityValue 6260420 |
| | | | | | Incoterms 6260422 | 0..1 6260424 | Incoterms 6260426 |
| In-voiceTerms 6260428 | | | | In-voiceTerms 6260430 | | 0..1 6260432 | |
| | | | | | InvoiceDate 6260434 | 0..1 6260436 | Date 6260438 |
| TotalVal-ues 6260440 | | | | TotalVal-ues 6260442 | | 0..1 6260444 | |
| | | | | | Request-edQuantity 6260446 | 0..1 6260448 | Quantity 6260450 |

FIG. 626-13

| Package | level 1 | level 2 | level 3 | level 4 | level 5 | Cardinality | Datatype Name |
|---|---|---|---|---|---|---|---|
| | | | | | Confirmed-Quantity 6260452 | 0..1 6260454 | Quantity 6260456 |
| | | | | | GrossWeightMeasure 6260458 | 0..1 6260460 | Measure 6260462 |
| | | | | | NetWeight-Measure 6260464 | 0..1 6260466 | Measure 6260468 |
| | | | | | Volume-Measure 6260470 | 0..1 6260472 | Measure 6260474 |
| | | | | | NetAmount 6260476 | 0..1 6260478 | Amount 6260480 |
| | | | | | NetPrice 6260482 | 0..1 6260484 | Price 6260486 |
| Sched-uleLine 6260488 | | | | Sched-uleLine 6260490 | | 0..N 6260492 | |

FIG. 626-14

| Package | level 1 | level 2 | level 3 | level 4 | level 5 | Cardinality | Datatype Name |
|---|---|---|---|---|---|---|---|
| | | | | | ID 6260494 | 1 6260496 | BusinessTransactionDocumentItemScheduleLineID 6260498 |
| | | | | | Date 6260500 | 0..1 6260502 | Date 6260504 |
| | | | | | RequestedQuantity 6260506 | 0..1 6260508 | Quantity 6260510 |
| | | | | | ConfirmedQuantity 6260512 | 0..1 6260514 | Quantity 6260516 |
| | | | | | DeliveryBlockingReasonCode 6260518 | 0..1 6260520 | BlockingReasonCode 6260522 |
| | | | | | ReceiptTime 6260524 | 0..1 6260526 | Time 6260528 |
| Log 6260530 | | Log 6260532 | | | | 1 6260534 | Log 6260536 |

FIG. 638-1

| Package | level 1 | level 2 | level 3 | level 4 | Cardinality | Datatype Name |
|---|---|---|---|---|---|---|
| StockTransport-PlanningOrder-ByElementsQue-ryMessage_sync 638000 | StockTransport-PlanningOrderByE-lementsQueryMes-sage_sync 638002 | | | | | StockTransport-PlanningOrderByE-lementsQueryMes-sage_sync 638004 |
| Message-Header 638006 | | MessageHeader 638008 | | | 1..1 638010 | BusinessDocu-mentMessage-Header 638012 |
| | | | ID 638014 | | 1..1 638016 | BusinessDocu-mentMessageID 638018 |
| | | | ReferenceID 638020 | | 0..1 638022 | BusinessDocu-mentMessageID 638024 |
| | | | Creation-DateTime 638026 | | 1..1 638028 | GLOBAL_DateTime 638030 |
| | | | TestDataIndi-cator 638032 | | 0..1 638034 | Indicator 638036 |

FIG. 638-2

| Package | level 1 | level 2 | level 3 | level 4 | Cardinality | Datatype Name |
|---|---|---|---|---|---|---|
| | | | Reconciliation-Indicator 638038 | | 0..1 638040 | Indicator 638042 |
| | | | SenderParty 638044 | | 0..1 638046 | BusinessDocumentMessage-HeaderParty 638048 |
| | | | | InternalID 638050 | 0..1 638052 | PartyInternalID 638054 |
| | | | | StandardID 638056 | 0..n 638058 | PartyStandardID 638060 |
| | | | | ContactPerson 638062 | 0..1 638064 | BusinessDocumentMessage-HeaderPartyContactPerson 638066 |
| | | | RecipientParty 638068 | | 0..n 638070 | BusinessDocumentMessage-HeaderParty 638072 |

FIG. 638-3

| Package | level 1 | level 2 | level 3 | level 4 | Cardinality | Datatype Name |
|---|---|---|---|---|---|---|
| | | | | InternalID 638074 | 0..1 638076 | PartyInternalID 638078 |
| | | | | StandardID 638080 | 0..n 638082 | PartyStandardID 638084 |
| | | | | ContactPerson 638086 | 0..1 638088 | BusinessDocumentMessageHeaderPartyContactPerson 638090 |
| | | | BusinessScopeBusinessProcess 638092 | | 0..1 638094 | BusinessScopeBusinessProcess 638096 |
| | | | | TypeCode 638098 | 1..1 6380100 | BusinessScopeBusinessProcessTypeCode 6380102 |
| | | | | InstanceID 6380104 | 0..1 6380106 | BusinessScopeBusinessProcessInstanceID 6380108 |

FIG. 638-4

| Package | level 1 | level 2 | level 3 | level 4 | Cardinality | Datatype Name |
|---|---|---|---|---|---|---|
| | | | | ID 6380110 | 0..1 6380112 | BusinessScope-BusinessProcessID 6380114 |
| Selection 6380116 | | StockTrans-portPlanningOr-derSelection-ByElements 6380118 | | | 1..1 6380120 | |
| | | | PlanningVer-sionID 6380122 | | 1..1 6380124 | PlanningVersionID 6380126 |
| | | | SelectionBy-ItemProduct-InternalID 6380128 | | 0..n 6380130 | |
| | | | | InclusionExclu-sionCode 6380132 | 0..1 6380134 | InclusionExclu-sionCode 6380136 |

FIG. 638-5

| Package | level 1 | level 2 | level 3 | level 4 | Cardinality | Datatype Name |
|---|---|---|---|---|---|---|
| | | | | IntervalBoundaryTypeCode 6380138 | 1..1 6380140 | IntervalBoundaryTypeCode 6380142 |
| | | | | LowerBoundaryProductInternalID 6380144 | 0..1 6380146 | ProductInternalID 6380148 |
| | | | | UpperBoundaryProductInternalID 6380150 | 0..1 6380152 | ProductInternalID 6380154 |
| | | | SelectionByItemTargetLocationInternalID 6380156 | | 0..n 6380158 | |
| | | | | InclusionExclusionCode 6380160 | 0..1 6380162 | InclusionExclusionCode 6380164 |

FIG. 638-6

| Package | level 1 | level 2 | level 3 | level 4 | Cardinality | Datatype Name |
|---|---|---|---|---|---|---|
| | | | | IntervalBound-aryTypeCode 6380166 | 1..1 6380168 | IntervalBound-aryTypeCode 6380170 |
| | | | | LowerBoundary-LocationInter-nalID 6380172 | 0..1 6380174 | LocationInternalID 6380176 |
| | | | | UpperBoundary-LocationInter-nalID 6380178 | 0..1 6380180 | LocationInternalID 6380182 |
| | | | SelectionBy-ItemSource-LocationInter-nalID 6380184 | | 0..n 6380186 | |
| | | | | InclusionExclu-sionCode 6380188 | 0..1 6380190 | InclusionExclu-sionCode 6380192 |

FIG. 638-7

| Package | level 1 | level 2 | level 3 | level 4 | Cardinality | Datatype Name |
|---|---|---|---|---|---|---|
| | | | | IntervalBoundaryTypeCode 6380194 | 1..1 6380196 | IntervalBoundaryTypeCode 6380198 |
| | | | | LowerBoundaryLocationInternalID 6380200 | 0..1 6380202 | LocationInternalID 6380204 |
| | | | | UpperBoundaryLocationInternalID 6380206 | 0..1 6380208 | LocationInternalID 6380210 |
| | | | SelectionByItemTransportMeansDescriptionCode 6380212 | | 0..n 6380214 | |
| | | | | InclusionExclusionCode 6380216 | 0..1 6380218 | InclusionExclusionCode 6380220 |

FIG. 638-8

| Package | level 1 | level 2 | level 3 | level 4 | Cardinality | Datatype Name |
|---|---|---|---|---|---|---|
| | | | | IntervalBound-aryTypeCode 6380222 | 1..1 6380224 | IntervalBound-aryTypeCode 6380226 |
| | | | | LowerBoundary-TransportMeans-DescriptionCode 6380228 | 0..1 6380230 | TransportMeans-DescriptionCode 6380232 |
| | | | | UpperBoundary-TransportMeans-DescriptionCode 6380234 | 0..1 6380236 | TransportMeans-DescriptionCode 6380238 |
| | | | ItemSched-uleLineAvail-ability-DateTimePe-riod 6380240 | | 0..1 6380242 | UPPEROPEN_GLOBAL_DateTimePeriod 6380244 |
| | | | | StartDateTime 6380246 | 0..1 6380248 | DateTime 6380250 |
| | | | | EndDateTime 6380252 | 0..1 6380254 | DateTime 6380256 |

FIG. 638-9

| Package | level 1 | level 2 | level 3 | level 4 | Cardinality | Datatype Name |
|---|---|---|---|---|---|---|
| | | | ItemScheduleLineRequirementDateTimePeriod 6380258 | | 0..1 6380260 | UPPEROPEN_GLOBAL_DateTimePeriod 6380262 |
| | | | | StartDateTime 6380264 | 0..1 6380266 | DateTime 6380268 |
| | | | | EndDateTime 6380270 | 0..1 6380272 | DateTime 6380274 |
| | | | ItemScheduleLineFixedIndicator 6380276 | | 0..1 6380278 | Indicator 6380280 |
| | | | SelectionOffsetNumber 6380282 | | 0..1 6380284 | NumberValue 6380286 |
| | | | MaximumNumberValue 6380288 | | 0..1 6380290 | NumberValue 6380292 |

FIG. 639-1

| Package | level 1 | level 2 | level 3 | level 4 | level 5 | Cardinality | Datatype Name |
|---|---|---|---|---|---|---|---|
| StockTransport PlanningOrder ByElements Response Message_sync 639000 | StockTransport PlanningOrder ByElements Response Message_sync 639002 | | | | | | Stock Transport Planning OrderBy Elements Response Message_ sync 639004 |
| Message-Header 639006 | | Message Header 639008 | | | | 1..1 639010 | Basic Business Document Message Header 639012 |
| | | | ID 639014 | | | 0..1 639016 | Business Document MessageID 639018 |

FIG. 639-2

| Package | level 1 | level 2 | level 3 | level 4 | level 5 | Cardinality | Datatype Name |
|---|---|---|---|---|---|---|---|
| | | | UUID 639020 | | | 0..1 639022 | ATTRIBUTE INDEPENDENT_UUID 639024 |
| | | | ReferenceID 639026 | | | 0..1 639028 | Business Document MessageID 639030 |
| | | | Reference UUID 639032 | | | 0..1 639034 | ATTRIBUTE INDEPENDENT_UUID 639036 |
| Stock Transport Planning Order 639038 | | Stock Transport Planning Order 639040 | | | | 0..n 639042 | |

FIG. 639-3

| Package | level 1 | level 2 | level 3 | level 4 | level 5 | Cardinality | Datatype Name |
|---|---|---|---|---|---|---|---|
| | | | ID 639044 | | | 1..1 639046 | Stock Transport Planning OrderID 639048 |
| | | | Planning VersionID 639050 | | | 1..1 639052 | Planning VersionID 639054 |
| Stock Transport Planning Order Item 639056 | | | Stock Transport Planning OrderItem 639058 | | | 1..1 639060 | |
| | | | | Product InternalID 639062 | | 1..1 639064 | Product InternalID 639066 |
| | | | | Target Location InternalID 639068 | | 1..1 639070 | Location InternalID 639072 |

FIG. 639-4

| Package | level 1 | level 2 | level 3 | level 4 | level 5 | Cardinality | Datatype Name |
|---|---|---|---|---|---|---|---|
| | | | | Source Location InternalID 639074 | | 1..1 639076 | Location InternalID 639078 |
| | | | | Transport Means Description Code 639080 | | 1..1 639082 | Transport Means Description Code 639084 |
| Stock Transport Planning Order Item Schedule Line 639086 | | | | StockTransport PlanningOrder ItemSchedule Line 639088 | | 1..1 639090 | |
| | | | | | Quantity 639092 | 1..1 639094 | Quantity 639096 |
| | | | | | Availability DateTime 639098 | 1..1 6390100 | GLOBAL_ DateTime 6390102 |

FIG. 639-5

| Package | level 1 | level 2 | level 3 | level 4 | level 5 | Cardinality | Datatype Name |
|---|---|---|---|---|---|---|---|
| | | | | | Fixed Indicator 6390104 | 1..1 6390106 | Indicator 6390108 |
| | | | | | Goods Receipt Duration 6390110 | 1..1 6390112 | Duration 6390114 |
| | | | | | Goods Receipt Capacity 6390116 | 0..1 6390118 | Quantity 6390120 |
| | | | | | Goods Receipt ResourceID 6390122 | 0..1 6390124 | ResourceID 6390126 |
| | | | | | Delivery DateTime 6390128 | 1..1 6390130 | GLOBAL_ DateTime 6390132 |
| | | | | | Transport Duration 6390134 | 1..1 6390136 | Duration 6390138 |

FIG. 639-6

| Package | level 1 | level 2 | level 3 | level 4 | level 5 | Cardinality | Datatype Name |
|---|---|---|---|---|---|---|---|
| | | | | | Transport Capacity 6390140 | 0..1 6390142 | Quantity 6390144 |
| | | | | | Transport ResourceID 6390146 | 0..1 6390148 | ResourceID 6390150 |
| | | | | | Shipment DateTime 6390152 | 1..1 6390154 | GLOBAL_ DateTime 6390156 |
| | | | | | GoodsIssue Duration 6390158 | 1..1 6390160 | Duration 6390162 |
| | | | | | GoodsIssue Capacity 6390164 | 0..1 6390166 | Quantity 6390168 |
| | | | | | GoodsIssue ResourceID 6390170 | 0..1 6390172 | ResourceID 6390174 |

FIG. 639-7

| Package | level 1 | level 2 | level 3 | level 4 | level 5 | Cardinality | Datatype Name |
|---|---|---|---|---|---|---|---|
| | | | | | Requirement DateTime 6390176 | 1..1 6390178 | GLOBAL_ DateTime 6390180 |
| Log 6390182 | | Log 6390184 | | | | 1..1 6390186 | Log 6390188 |
| | | | Business Document Processing ResultCode 6390190 | | | 0..1 6390192 | Processing ResultCode 6390194 |
| | | | Maximum LogItem Severity Code 6390196 | | | 0..1 6390198 | LogItem Severity Code 6390200 |
| | | | Item 6390202 | | | 0..n 6390204 | LogItem 6390206 |

FIG. 640-1

| Package | level 1 | level 2 | level 3 | level 4 | Cardinality | Datatype Name |
|---|---|---|---|---|---|---|
| StockTransportPlanningOrderByIDQueryMessage_sync 640000 | StockTransportPlanningOrderByIDQueryMessage_sync 640002 | | | | | StockTransportPlanningOrderByIDQueryMessage_sync 640004 |
| MessageHeader 640006 | | MessageHeader 640008 | | | 1..1 640010 | BusinessDocumentMessageHeader 640012 |
| | | | ID 640014 | | 1 640016 | BusinessDocumentMessageID 640018 |
| | | | ReferenceID 640020 | | 0..1 640022 | BusinessDocumentMessageID 640024 |
| | | | CreationDateTime 640026 | | 1 640028 | GLOBAL_DateTime 640030 |

FIG. 640-2

| Package | level 1 | level 2 | level 3 | level 4 | Cardinality | Datatype Name |
|---|---|---|---|---|---|---|
| | | | TestDataIndicator 640032 | | 0..1 640034 | Indicator 640036 |
| | | | ReconciliationIndicator 640038 | | 0..1 640040 | Indicator 640042 |
| | | | SenderParty 640044 | | 0..1 640046 | BusinessDocumentMessageHeaderParty 640048 |
| | | | | InternalID 640050 | 0..1 640052 | PartyInternalID 640054 |
| | | | | StandardID 640056 | 0..n 640058 | PartyStandardID 640060 |

FIG. 640-3

| Package | level 1 | level 2 | level 3 | level 4 | Cardinality | Datatype Name |
|---|---|---|---|---|---|---|
| | | | | Contact-Person 640062 | 0..1 640064 | Business-DocumentMes-sageHeader-PartyContact-Person 640066 |
| | | | RecipientParty 640068 | | 0..n 640070 | Business-DocumentMes-sageHeader-Party 640072 |
| | | | | Inter-nalID 640074 | 0..1 640076 | PartyInternalID 640078 |
| | | | | Stan-dardID 640080 | 0..n 640082 | PartyStan-dardID 640084 |

FIG. 640-4

| Package | level 1 | level 2 | level 3 | level 4 | Cardinality | Datatype Name |
|---|---|---|---|---|---|---|
| | | | | Contact-Person 640086 | 0..1 640088 | Business-DocumentMes-sageHeader-PartyContact-Person 640090 |
| | | | BusinessS-copeBusi-nessProcess 640092 | | 0..1 640094 | BusinessS-copeBusi-nessProcess 640096 |
| | | | | Type-Code 640098 | 1 6400100 | BusinessS-copeBusi-nessProc-essTypeCode 6400102 |
| | | | | In-stanceID 6400104 | 0..1 6400106 | BusinessS-copeBusi-nessProcessIn-stanceID 6400108 |

FIG. 640-5

| Package | level 1 | level 2 | level 3 | level 4 | Cardinality | Datatype Name |
|---|---|---|---|---|---|---|
| | | | | ID 6400110 | 0..1 6400112 | BusinessScopeBusinessProcessID 6400114 |
| Selection 6400116 | | StockTransportPlanningOrderSelectionByID 6400118 | | | 1..1 6400120 | |
| | | | StockTransportPlanningOrderID 6400122 | | 1..1 6400124 | StockTransportPlanningOrderID 6400126 |

FIG. 641-1

| Package | level 1 | level 2 | level 3 | level 4 | level 5 | Cardinality | Datatype Name |
|---|---|---|---|---|---|---|---|
| StockTransportPlanningOrderByIDResponseMessage_sync 641000 | StockTransportPlanningOrderByIDResponseMessage_sync 641002 | | | | | | StockTransportPlanningOrderByIDResponseMessage_sync 641004 |
| MessageHeader 641006 | | MessageHeader 641008 | | | | 1..1 641010 | BasicBusinessDocumentMessageHeader 641012 |
| | | | ID 641014 | | | 0..1 641016 | BusinessDocumentMessageID 641018 |
| | | | UUID 641020 | | | 0..1 641022 | ATTRIBUTEINDEPENDENT_UUID 641024 |

FIG. 641-2

| Package | level 1 | level 2 | level 3 | level 4 | level 5 | Cardinality | Datatype Name |
|---|---|---|---|---|---|---|---|
| | | | ReferenceID 641026 | | | 0..1 641028 | Business-Document-MessageID 641030 |
| | | | Refer-enceUUID 641032 | | | 0..1 641034 | ATTRIBUTEINDEPENDENT_UUID 641036 |
| StockTransport-PlanningOrder 641038 | | StockTrans-portPlannin-gOrder 641040 | | | | 0..1 641042 | |
| | | | ID 641044 | | | 1..1 641046 | StockTrans-portPlannin-gOrderID 641048 |
| | | | PlanningVer-sionID 641050 | | | 1..1 641052 | PlanningVer-sionID 641054 |

FIG. 641-3

| Package | level 1 | level 2 | level 3 | level 4 | level 5 | Cardinality | Datatype Name |
|---|---|---|---|---|---|---|---|
| StockTransport-PlanningOrde-rItem 641056 | | | StockTrans-portPlannin-gOrderItem 641058 | | | 1..1 641060 | |
| | | | | ProductInter-nalID 641062 | | 1..1 641064 | ProductInter-nalID 641066 |
| | | | | TargetLoca-tionInternalID 641068 | | 1..1 641070 | LocationInter-nalID 641072 |
| | | | | SourceLoca-tionInternalID 641074 | | 1..1 641076 | LocationInter-nalID 641078 |
| | | | | Transport-MeansDe-scriptionCode 641080 | | 1..1 641082 | Transport-MeansDescrip-tionCode 641084 |

FIG. 641-4

| Package | level 1 | level 2 | level 3 | level 4 | level 5 | Cardinality | Datatype Name |
|---|---|---|---|---|---|---|---|
| StockTrans-portPlannin-gOrderItem-ScheduleLine 641086 | | | | StockTrans-portPlannin-gOrderItem-ScheduleLine 641088 | | 1..1 641090 | |
| | | | | | Quantity 641092 | 1..1 641094 | Quantity 641096 |
| | | | | | Availability-DateTime 641098 | 1..1 6410100 | GLOBAL_Date Time 6410102 |
| | | | | | FixedIndica-tor 6410104 | 1..1 6410106 | Indicator 6410108 |
| | | | | | GoodsRe-ceiptDuration 6410110 | 1..1 6410112 | Duration 6410114 |
| | | | | | GoodsRe-ceiptCapacity 6410116 | 0..1 6410118 | Quantity 6410120 |

FIG. 641-5

| Package | level 1 | level 2 | level 3 | level 4 | level 5 | Cardinality | Datatype Name |
|---|---|---|---|---|---|---|---|
| | | | | | GoodsReceiptResourceID 6410122 | 0..1 6410124 | ResourceID 6410126 |
| | | | | | DeliveryDateTime 6410128 | 1..1 6410130 | GLOBAL_Date Time 6410132 |
| | | | | | TransportDuration 6410134 | 1..1 6410136 | Duration 6410138 |
| | | | | | TransportCapacity 6410140 | 0..1 6410142 | Quantity 6410144 |
| | | | | | TransportResourceID 6410146 | 0..1 6410148 | ResourceID 6410150 |
| | | | | | ShipmentDateTime 6410152 | 1..1 6410154 | GLOBAL_Date Time 6410156 |

FIG. 641-6

| Package | level 1 | level 2 | level 3 | level 4 | level 5 | Cardinality | Datatype Name |
|---|---|---|---|---|---|---|---|
| | | | | | GoodsIs-sueDuration 6410158 | 1..1 6410160 | Duration 6410162 |
| | | | | | GoodsIs-sueCapacity 6410164 | 0..1 6410166 | Quantity 6410168 |
| | | | | | GoodsIssu-eResourceID 6410170 | 0..1 6410172 | ResourceID 6410174 |
| | | | | | Requirement DateTime 6410176 | 1..1 6410178 | GLOBAL_Date Time 6410180 |
| Log 6410182 | | Log 6410184 | | | | 1..1 6410186 | Log 6410188 |
| | | | Business-Document-Processin-gResultCode 6410190 | | | 0..1 6410192 | ProcessingRe-sultCode 6410194 |

FIG. 641-7

| Package | level 1 | level 2 | level 3 | level 4 | level 5 | Cardinality | Datatype Name |
|---|---|---|---|---|---|---|---|
| | | | Maximum-LogItem-SeverityCode 6410196 | | | 0..1 6410198 | LogItemSeverityCode 6410200 |
| | | | Item 6410202 | | | 0..n 6410204 | LogItem 6410206 |

FIG. 642-1

| Package | level 1 | level 2 | level 3 | Cardinality | Datatype Name |
|---|---|---|---|---|---|
| StockTransportPlanningOrderCancelConfirmationMessage_sync 642000 | StockTransportPlanningOrderCancelConfirmationMessage_sync 642002 | | | | StockTransportPlanningOrderCancelConfirmationMessage_sync 642004 |
| MessageHeader 642006 | | MessageHeader 642008 | | 1..1 642010 | BasicBusinessDocumentMessageHeader 642012 |
| | | | ID 642014 | 0..1 642016 | BusinessDocumentMessageID 642018 |
| | | | UUID 642020 | 0..1 642022 | ATTRIBUTEINDEPENDENT_UUID 642024 |
| | | | ReferenceID 642026 | 0..1 642028 | BusinessDocumentMessageID 642030 |

FIG. 642-2

| Package | level 1 | level 2 | level 3 | Cardinality | Datatype Name |
|---|---|---|---|---|---|
| | | | ReferenceUUID 642032 | 0..1 642034 | ATTRIBUTEINDEPENDENT_UUID 642036 |
| StockTransportPlanningOrder 642038 | | StockTransportPlanningOrder 642040 | | 0..1 642042 | |
| | | | ID 642044 | 1..1 642046 | StockTransportPlanningOrderID 642048 |
| Log 642050 | | Log 642052 | | 1..1 642054 | Log 642056 |
| | | | BusinessDocumentProcessingResultCode 642058 | 0..1 642060 | ProcessingResultCode 642062 |

FIG. 642-3

| Package | | level 1 | level 2 | level 3 | Cardinality | Datatype Name |
|---|---|---|---|---|---|---|
| | | | | Maximum-LogItem-SeverityCode 642064 | 0..1 642066 | LogItemSeverityCode 642068 |
| | | | | Item 642070 | 0..n 642072 | LogItem 642074 |

FIG. 643-1

| Package | level 1 | level 2 | level 3 | level 4 | Cardinality | Datatype Name |
|---|---|---|---|---|---|---|
| StockTransport-PlanningOrder-CancelRequest-Message_sync 643000 | StockTransport-PlanningOrder-CancelRequest-Message_sync 643002 | | | | | StockTransport-PlanningOrder-CancelRequest-Message_sync 643004 |
| MessageHeader 643006 | | Message-Header 643008 | | | 1..1 643010 | BusinessDocu-mentMessage-Header 643012 |
| | | | ID 643014 | | 1 643016 | BusinessDocu-mentMessageID 643018 |
| | | | ReferenceID 643020 | | 0..1 643022 | BusinessDocu-mentMessageID 643024 |
| | | | Creation-DateTime 643026 | | 1 643028 | GLOBAL_DateTim e 643030 |
| | | | TestDataIndi-cator 643032 | | 0..1 643034 | Indicator 643036 |

FIG. 643-2

| Package | level 1 | level 2 | level 3 | level 4 | Cardinality | Datatype Name |
|---|---|---|---|---|---|---|
| | | | Reconciliation-Indicator 643038 | | 0..1 643040 | Indicator 643042 |
| | | | SenderParty 643044 | | 0..1 643046 | BusinessDocumentMessage-HeaderParty 643048 |
| | | | | InternalID 643050 | 0..1 643052 | PartyInternalID 643054 |
| | | | | StandardID 643056 | 0..n 643058 | PartyStandardID 643060 |
| | | | | ContactPerson 643062 | 0..1 643064 | BusinessDocumentMessage-HeaderPartyContactPerson 643066 |
| | | | RecipientParty 643068 | | 0..n 643070 | BusinessDocumentMessage-HeaderParty 643072 |

FIG. 643-3

| Package | level 1 | level 2 | level 3 | level 4 | Cardinality | Datatype Name |
|---|---|---|---|---|---|---|
| | | | | InternalID 643074 | 0..1 643076 | PartyInternalID 643078 |
| | | | | StandardID 643080 | 0..n 643082 | PartyStandardID 643084 |
| | | | | ContactPerson 643086 | 0..1 643088 | BusinessDocumentMessageHeaderPartyContactPerson 643090 |
| | | | BusinessScopeBusinessProcess 643092 | | 0..1 643094 | BusinessScopeBusinessProcess 643096 |
| | | | | TypeCode 643098 | 1 6430100 | BusinessScopeBusinessProcessTypeCode 6430102 |
| | | | | InstanceID 6430104 | 0..1 6430106 | BusinessScopeBusinessProcessInstanceID 6430108 |

FIG. 643-4

| Package | level 1 | level 2 | level 3 | level 4 | Cardinality | Datatype Name |
|---|---|---|---|---|---|---|
| | | | | ID 6430110 | 0..1 6430112 | BusinessScope-BusinessProces-sID 6430114 |
| StockTrans-portPlanningOr-der 6430116 | | StockTrans-portPlannin-gOrder 6430118 | | | 1..1 6430120 | |
| | | | ID 6430122 | | 1..1 6430124 | StockTransport-PlanningOrderID 6430126 |

FIG. 644-1

| Package | level 1 | level 2 | level 3 | Cardinality | Datatype Name |
|---|---|---|---|---|---|
| StockTransport-PlanningOrder-ChangeConfirma-tionMessage_sync 644000 | StockTransport-PlanningOrder-ChangeConfir-mationMes-sage_sync 644002 | | | | StockTransport-PlanningOrder-ChangeConfirma-tionMes-sage_sync 644004 |
| MessageHeader 644006 | | Message-Header 644008 | | 1..1 644010 | BasicBusiness-DocumentMes-sageHeader 644012 |
| | | | ID 644014 | 0..1 644016 | BusinessDocu-mentMessageID 644018 |
| | | | UUID 644020 | 0..1 644022 | ATTRIBUTEINDE PENDENT_UUID 644024 |
| | | | ReferenceID 644026 | 0..1 644028 | BusinessDocu-mentMessageID 644030 |

FIG. 644-2

| Package | level 1 | level 2 | level 3 | Cardinality | Datatype Name |
|---|---|---|---|---|---|
| | | | ReferenceUUID 644032 | 0..1 644034 | ATTRIBUTEINDEPENDENT_UUID 644036 |
| StockTransport-PlanningOrder 644038 | | StockTrans-portPlannin-gOrder 644040 | | 0..1 644042 | |
| | | | ID 644044 | 1..1 644046 | StockTransport-PlanningOrderID 644048 |
| Log 644050 | | Log 644052 | | 1..1 644054 | Log 644056 |
| | | | Business-DocumentProc-essingResult-Code 644058 | 0..1 644060 | ProcessingRe-sultCode 644062 |
| | | | Maximum-LogItemSeveri-tyCode 644064 | 0..1 644066 | LogItemSeverity-Code 644068 |

FIG. 644-3

| Package | level 1 | level 2 | level 3 | Cardinality | Datatype Name |
|---|---|---|---|---|---|
| | | | Item 644070 | 0..n 644072 | LogItem 644074 |

FIG. 645-1

| Package | level 1 | level 2 | level 3 | level 4 | level 5 | Cardinality | Datatype Name |
|---|---|---|---|---|---|---|---|
| StockTransport-PlanningOrder-ChangeRequest-Message_sync 645000 | StockTrans-portPlannin-gOrder-ChangeRe-questMes-sage_sync 645002 | | | | | | StockTransport-PlanningOrder-ChangeRe-questMes-sage_sync 645004 |
| MessageHeader 645006 | | Message-Header 645008 | | | | 1..1 645010 | BusinessDocu-mentMessage-Header 645012 |
| | | | ID 645014 | | | 1 645016 | BusinessDocu-mentMessageID 645018 |
| | | | Referen-ceID 645020 | | | 0..1 645022 | BusinessDocu-mentMessageID 645024 |
| | | | Creation-DateTime 645026 | | | 1 645028 | GLOBAL_DateTi me 645030 |

FIG. 645-2

| Package | level 1 | level 2 | level 3 | level 4 | level 5 | Cardinality | Datatype Name |
|---|---|---|---|---|---|---|---|
| | | | TestDataIndicator 645032 | | | 0..1 645034 | Indicator 645036 |
| | | | ReconciliationIndicator 645038 | | | 0..1 645040 | Indicator 645042 |
| | | | SenderParty 645044 | | | 0..1 645046 | BusinessDocumentMessageHeaderParty 645048 |
| | | | | InternalID 645050 | | 0..1 645052 | PartyInternalID 645054 |
| | | | | StandardID 645056 | | 0..n 645058 | PartyStandardID 645060 |
| | | | | ContactPerson 645062 | | 0..1 645064 | BusinessDocumentMessageHeaderPartyContactPerson 645066 |

FIG. 645-3

| Package | level 1 | level 2 | level 3 | level 4 | level 5 | Cardinality | Datatype Name |
|---|---|---|---|---|---|---|---|
| | | | Recipient-Party 645068 | | | 0..n 645070 | BusinessDocumentMessageHeaderParty 645072 |
| | | | | InternalID 645074 | | 0..1 645076 | PartyInternalID 645078 |
| | | | | StandardID 645080 | | 0..n 645082 | PartyStandardID 645084 |
| | | | | Contact-Person 645086 | | 0..1 645088 | BusinessDocumentMessageHeaderParty-ContactPerson 645090 |
| | | | BusinessScopeBusinessProcess 645092 | | | 0..1 645094 | BusinessScope-BusinessProcess 645096 |

FIG. 645-4

| Package | level 1 | level 2 | level 3 | level 4 | level 5 | Cardinality | Datatype Name |
|---|---|---|---|---|---|---|---|
| | | | | TypeCode 645098 | | 1 6450100 | BusinessScope-BusinessProc-essTypeCode 6450102 |
| | | | | InstanceID 6450104 | | 0..1 6450106 | BusinessScope-BusinessProc-essInstanceID 6450108 |
| | | | | ID 6450110 | | 0..1 6450112 | BusinessScope-BusinessProces-sID 6450114 |
| StockTransport-PlanningOrder 6450116 | | Stock-Transport-Plannin-gOrder 6450118 | | | | 1..1 6450120 | |
| | | | ID 6450122 | | | 1..1 6450124 | StockTransport-PlanningOrderID 6450126 |

FIG. 645-5

| Package | level 1 | level 2 | level 3 | level 4 | level 5 | Cardinality | Datatype Name |
|---|---|---|---|---|---|---|---|
| StockTrans-portPlannin-gOrderItem 6450128 | | | Stock-Transport-Plannin-gOrderItem 6450130 | | | 1..1 6450132 | |
| StockTrans-portPlannin-gOrderItem-Sched-uleLine 6450134 | | | | Stock-Transport-Plannin-gOrderItem-ScheduleLi ne 6450136 | | 1..1 6450138 | |
| | | | | | Quantity 6450140 | 0..1 6450142 | Quantity 6450144 |
| | | | | | Availability-DateTime 6450146 | 0..1 6450148 | GLOBAL_DateTi me 6450150 |
| | | | | | FixedIndica-tor 6450152 | 0..1 6450154 | Indicator 6450156 |

FIG. 646-1

| Package | level 1 | level 2 | level 3 | Cardinality | Datatype Name |
|---|---|---|---|---|---|
| StockTransportPlanningOrderCreateConfirmationMessage_sync 646000 | StockTransportPlanningOrderCreateConfirmationMessage_sync 646002 | | | | StockTransportPlanningOrderCreateConfirmationMessage_sync 646004 |
| MessageHeader 646006 | | MessageHeader 646008 | | 1..1 646010 | BasicBusinessDocumentMessageHeader 646012 |
| | | | ID 646014 | 0..1 646016 | BusinessDocumentMessageID 646018 |
| | | | UUID 646020 | 0..1 646022 | ATTRIBUTEINDEPENDENT_UUID 646024 |
| | | | ReferenceID 646026 | 0..1 646028 | BusinessDocumentMessageID 646030 |
| | | | ReferenceUUID 646032 | 0..1 646034 | ATTRIBUTEINDEPENDENT_UUID 646036 |

FIG. 646-2

| Package | level 1 | level 2 | level 3 | Cardinality | Datatype Name |
|---|---|---|---|---|---|
| StockTransport-PlanningOrder 646038 | | StockTrans-portPlanningOr-der 646040 | | 0..1 646042 | |
| | | | ID 646044 | 1..1 646046 | StockTransport-PlanningOrderID 646048 |
| Log 646050 | | Log 646052 | | 1..1 646054 | Log 646056 |
| | | | BusinessDocu-mentProcessin-gResultCode 646058 | 0..1 646060 | ProcessingRe-sultCode 646062 |
| | | | Maximum-LogItemSeveri-tyCode 646064 | 0..1 646066 | LogItemSeverity-Code 646068 |
| | | | Item 646070 | 0..n 646072 | LogItem 646074 |

FIG. 647-1

| Package | level 1 | level 2 | level 3 | level 4 | level 5 | Cardinality | Datatype Name |
|---|---|---|---|---|---|---|---|
| StockTransportPlanningOrderCreateRequestMessage_sync 647000 | StockTransportPlanningOrderCreateRequestMessage_sync 647002 | | | | | | StockTransportPlanningOrderCreateRequestMessage_sync 647004 |
| MessageHeader 647006 | | MessageHeader 647008 | | | | 1..1 647010 | BusinessDocumentMessageHeader 647012 |
| | | | ID 647014 | | | 1 647016 | BusinessDocumentMessageID 647018 |
| | | | ReferenceID 647020 | | | 0..1 647022 | BusinessDocumentMessageID 647024 |
| | | | CreationDateTime 647026 | | | 1 647028 | GLOBAL_DateTime 647030 |

FIG. 647-2

| Package | level 1 | level 2 | level 3 | level 4 | level 5 | Cardinality | Datatype Name |
|---|---|---|---|---|---|---|---|
| | | | TestDataIn-dicator 647032 | | | 0..1 647034 | Indicator 647036 |
| | | | Reconcilia-tionIndicator 647038 | | | 0..1 647040 | Indicator 647042 |
| | | | SenderParty 647044 | | | 0..1 647046 | Business-DocumentMes-sageHeader-Party 647048 |
| | | | | InternalID 647050 | | 0..1 647052 | PartyInternalID 647054 |
| | | | | StandardID 647056 | | 0..n 647058 | PartyStan-dardID 647060 |

FIG. 647-3

| Package | level 1 | level 2 | level 3 | level 4 | level 5 | Cardinality | Datatype Name |
|---|---|---|---|---|---|---|---|
| | | | | ContactPer-son 647062 | | 0..1 647064 | Business-DocumentMes-sageHeader-PartyContact-Person 647066 |
| | | | Recipient-Party 647068 | | | 0..n 647070 | Business-DocumentMes-sageHeader-Party 647072 |
| | | | | InternalID 647074 | | 0..1 647076 | PartyInternalID 647078 |
| | | | | StandardID 647080 | | 0..n 647082 | PartyStan-dardID 647084 |
| | | | | ContactPer-son 647086 | | 0..1 647088 | Business-DocumentMes-sageHeader-PartyContact-Person 647090 |

FIG. 647-4

| Package | level 1 | level 2 | level 3 | level 4 | level 5 | Cardinality | Datatype Name |
|---|---|---|---|---|---|---|---|
| | | | BusinessScopeBusinessProcess 647092 | | | 0..1 647094 | BusinessScopeBusinessProcess 647096 |
| | | | | TypeCode 647098 | | 1 6470100 | BusinessScopeBusinessProcessTypeCode 6470102 |
| | | | | InstanceID 6470104 | | 0..1 6470106 | BusinessScopeBusinessProcessInstanceID 6470108 |
| | | | | ID 6470110 | | 0..1 6470112 | BusinessScopeBusinessProcessID 6470114 |
| StockTransportPlanningOrder 6470116 | | StockTransportPlanningOrder 6470118 | | | | 1..1 6470120 | |

FIG. 647-5

| Package | level 1 | level 2 | level 3 | level 4 | level 5 | Cardinality | Datatype Name |
|---|---|---|---|---|---|---|---|
| | | | Planning-VersionID 6470122 | | | 1..1 6470124 | PlanningVer-sionID 6470126 |
| StockTrans-portPlanningOr-derItem 6470128 | | | StockTrans-portPlannin-gOrderItem 6470130 | | | 1..1 6470132 | |
| | | | | ProductInter-nalID 6470134 | | 1..1 6470136 | ProductInter-nalID 6470138 |
| | | | | TargetLoca-tionInternalID 6470140 | | 1..1 6470142 | LocationInter-nalID 6470144 |
| | | | | SourceLoca-tionInternalID 6470146 | | 1..1 6470148 | LocationInter-nalID 6470150 |
| | | | | Transport-MeansDe-scriptionCode 6470152 | | 1..1 6470154 | Transport-MeansDescrip-tionCode 6470156 |

FIG. 647-6

| Package | level 1 | level 2 | level 3 | level 4 | level 5 | Cardinality | Datatype Name |
|---|---|---|---|---|---|---|---|
| StockTrans-portPlannin-gOrderItem-ScheduleLine 6470158 | | | | StockTrans-portPlannin-gOrderItem-ScheduleLine 6470160 | | 1..1 6470162 | |
| | | | | | Quantity 6470164 | 1..1 6470166 | Quantity 6470168 |
| | | | | | FixedIndicator 6470170 | 1..1 6470172 | Indicator 6470174 |
| | | | | | Availability-DateTime 6470176 | 1..1 6470178 | GLOBAL_Date Time 6470180 |

FIG. 651-1

| Package | level 1 | level 2 | level 3 | level 4 | level 5 | level 6 | Cardinality | Datatype Name |
|---|---|---|---|---|---|---|---|---|
| StrategicInvestment-BuySimulateQueryMessage 651000 | StrategicInvest-mentBuySimu-lateQueryMes-sage 651002 | | | | | | | <Mes-sage-DataType> 651004 |
| MessageHeader 651006 | | Mes-sage-Header 651008 | | | | | 1 651010 | Busi-nessDocu ment-Message-Header 651012 |
| | | | ID 651014 | | | | 1 651016 | Busi-nessDocu ment-MessageID 651018 |
| | | | Creation-DateTime 651020 | | | | 1 651022 | DateTime 651024 |

FIG. 651-2

| Package | level 1 | level 2 | level 3 | level 4 | level 5 | level 6 | Cardinality | Datatype Name |
|---|---|---|---|---|---|---|---|---|
| | | | ... | | | | 0..1 651026 | ... |
| StrategicInvestment-BuySimulateQuery 651028 | | Strate-gicIn-vest-ment-BuySim ulate-Query 651030 | | | | | 1 651032 | ... |
| Discount 651034 | | | Discount 651036 | | | | ... | ... |
| | | | | Dicount-Percent 651038 | | | 0..1 651040 | Percent 651042 |
| | | | | Minimu-mOr-deredA-mount 651044 | | | 0..1 651046 | Amount 651048 |

FIG. 651-3

| Package | level 1 | level 2 | level 3 | level 4 | level 5 | level 6 | Cardinality | Datatype Name |
|---|---|---|---|---|---|---|---|---|
| | | | | ValidityTimePointPeriod 651050 | | | 0..1 651052 | TimePointPeriod 651054 |
| Item 651056 | | | Item 651058 | | | | ... | ... |
| ProductInformation 651060 | | | | ProductInformation 651062 | | | ... | ... |
| | | | | | ProductInternalID 651064 | | 1 651066 | ProductInternalID 651068 |
| | | | | | StorageCostAmount 651070 | | 0..1 651072 | Amount 651074 |

FIG. 651-4

| Package | level 1 | level 2 | level 3 | level 4 | level 5 | level 6 | Cardinality | Datatype Name |
|---|---|---|---|---|---|---|---|---|
| | | | | | Order-Rate 651076 | | 1 651078 | Rate 651080 |
| | | | | | BaseR-ate 651082 | | 1 651084 | Rate 651086 |
| | | | | | Quan-tites 651088 | | | |
| | | | | | | Location-Inventory Quantity 651090 | 0..1 651092 | Quantity 651094 |
| | | | | | | Open-Quantity 651096 | 0..1 651098 | Quantity 6510100 |

FIG. 651-5

| Package | level 1 | level 2 | level 3 | level 4 | level 5 | level 6 | Cardinality | Datatype Name |
|---|---|---|---|---|---|---|---|---|
| | | | | | | Monthly-Con-sumption Quantity 6510102 | 1 6510104 | Quantity 6510106 |
| Plant 6510108 | | | | Plant 6510110 | | | ... | |
| | | | | | PlantId 6510112 | | 1 6510114 | PlantID 6510116 |
| Discount 6510118 | | | | Discount 6510120 | | | ... | ... |
| | | | | | Discount-Percent 6510122 | | 0..1 6510124 | Percent 6510126 |
| | | | | | Discoun-tAmount 6510128 | | 0..1 6510130 | Amount 6510132 |

FIG. 651-6

| Package | level 1 | level 2 | level 3 | level 4 | level 5 | level 6 | Cardinality | Datatype Name |
|---|---|---|---|---|---|---|---|---|
| | | | | | New-Price 6510134 | | 0..1 6510136 | Price 6510138 |
| Product-Procure-mentAr-range-ment 6510140 | | | | Product-Pro-curemen-tAr-rangeme nt 6510142 | | | … | … |
| | | | | | Product-Pro-curemen-tAr-rangeme ntID 6510144 | | 1 6510146 | Product-Procure-mentAr-range-mentID 6510148 |
| | | | | | Current-Price 6510150 | | 1 6510152 | Price 6510154 |

FIG. 651-7

| Package | level 1 | level 2 | level 3 | level 4 | level 5 | level 6 | Cardinality | Datatype Name |
|---|---|---|---|---|---|---|---|---|
| | | | | | Order-PriceR-ate 6510156 | | 1 6510158 | Rate 6510160 |
| | | | | | PartyId 6510162 | | 1 6510164 | PartyID 6510166 |
| | | | | | Organi-sational-CentreId 6510168 | | 1 6510170 | Organisa-tionalCen-treID 6510172 |

FIG. 652-1

| Package | level 1 | level 2 | level 3 | level 4 | level 5 | Cardinality | Datatype Name |
|---|---|---|---|---|---|---|---|
| StrategicInvest-mentBuySimu-lateResponse-Message 652000 | StrategicInvest-mentBuySimulateR-esponseMessage 652002 | | | | | | <MessageDataType> 652004 |
| Message-Header 652006 | | MessageHeader 652008 | | | | 1 652010 | BusinessDocumentMes-sageHeader 652012 |
| | | | ID 652014 | | | 1 652016 | BusinessDocumentMes-sageID 652018 |
| | | | Creation DateTim e 652020 | | | 1 652022 | DateTime 652024 |
| | | | … | | | 0..1 652026 | … |

FIG. 652-2

| Package | level 1 | level 2 | level 3 | level 4 | level 5 | Cardinality | Datatype Name |
|---|---|---|---|---|---|---|---|
| StrategicIn-vestment-BuySimulateR-esponse 652028 | | StrategicInvest-mentBuySimu-lateResponse 652030 | | | | 1 652032 | ... |
| CostSavings 652034 | | | Cost-Savings 652036 | | | | ... |
| | | | | Saved-CostA-mount 652038 | | 0..1 652040 | Amount 652042 |
| TotalOr-derAmount 652044 | | | Pro-posed-Tota-lAmount 652046 | | | | |
| | | | | Pro-posed-Tota-lAmount 652048 | | 0..1 652050 | Amount 652052 |

FIG. 652-3

| Package | level 1 | level 2 | level 3 | level 4 | level 5 | Cardinality | Datatype Name |
|---|---|---|---|---|---|---|---|
| Item 652054 | | | Item 652056 | | | ... | ... |
| ProductIn-formation 652058 | | | | Product-Informa-tion 652060 | | ... | ... |
| | | | | | Product-Inter-nalID 652062 | 1 652064 | ProductInternalID 652066 |
| | | | | | Storage-CostA-mount 652068 | 0..1 652070 | Amount 652072 |
| | | | | | Order-Rate 652074 | 1 652076 | Rate 652078 |
| | | | | | BaseR-ate 652080 | 1 652082 | Rate 652084 |

FIG. 652-4

| Package | level 1 | level 2 | level 3 | level 4 | level 5 | Cardinality | Datatype Name |
|---|---|---|---|---|---|---|---|
| CostSav-ings 652086 | | | | Cost-Saving-sAmount 652088 | | ... | ... |
| | | | | | Saved-CostA-mount 652090 | 0..1 652092 | Amount 652094 |
| | | | | | New-Price 652096 | 0..1 652098 | Price 6520100 |
| Pur-chaseOr-derPro-posal 6520102 | | | | Pur-chaseOr derPro-posal 6520104 | | ... | ... |
| | | | | | Propose dOrder-Quantity 6520106 | 0..1 6520108 | Quantity 6520110 |

FIG. 652-5

| Package | level 1 | level 2 | level 3 | level 4 | level 5 | Cardinality | Datatype Name |
|---|---|---|---|---|---|---|---|
| | | | | | ProposedOrdering-TimePoint 6520112 | 0..1 6520114 | Date 6520116 |
| | | | | | ProposedOrderedA-mount 6520118 | 0..1 6520120 | Amount 6520122 |
| StrategicInvest-mentBuy-Grafics 6520124 | | | | StrategicInvest-ment-BuyDe-tail 6520126 | | ... | ... |

FIG. 652-6

| Package | level 1 | level 2 | level 3 | level 4 | level 5 | Cardinality | Datatype Name |
|---|---|---|---|---|---|---|---|
| | | | | | Product-Inter-nalID 6520128 | 1 6520130 | ProductInternalID 6520132 |
| | | | | | PlantID 6520134 | 1 6520136 | PlantID 6520138 |
| | | | | | ProposedOr-dered-Quantity 6520140 | 1 6520142 | Quantity 6520144 |
| | | | | | Saved-CostA-mount 6520146 | 1 6520148 | Amount 6520150 |
| | | | | | Week-Coun-terValue 6520152 | 1 6520154 | CounterValue 6520156 |

FIG. 664-1

| Package | level 1 | level 2 | level 3 | level 4 | Cardinality | Datatype Name |
|---|---|---|---|---|---|---|
| SupplyPlanningArea ByLocationIDAnd LocationTypeCode QueryMessage 664000 | SupplyPlanningArea ByLocationIDAnd LocationTypeCode QueryMessage 664002 | | | | | SupplyPlanningArea ByLocationIDAnd LocationTypeCode QueryMessage 664004 |
| MessageHeader 664006 | | MessageHeader 664008 | | | 1 664010 | BusinessDocument MessageHeader 664012 |
| Selection 664014 | | SupplyPlanningArea SelectionByLocation IDAndLocation TypeCode 664016 | | | 1 664018 | ... |
| | | | SelectionBy Location InternalID 664020 | | 0..n 664022 | ... 664024 |
| | | | | Inclusion Exclusion Code 664026 | 0..1 664028 | Inclusion ExclusionCode 664030 |

FIG. 664-2

| Package | level 1 | level 2 | level 3 | level 4 | Cardinality | Datatype Name |
|---|---|---|---|---|---|---|
| | | | | Interval Boundary TypeCode 664032 | 1 664034 | IntervalBoundary TypeCode 664036 |
| | | | | Lower Boundary Location InternalID 664038 | 0..1 664040 | LocationInternalID 664042 |
| | | | | Upper Boundary Location InternalID 664044 | 0..1 664046 | LocationInternalID 664048 |
| | | | SelectionBy Location TypeCode 664050 | | 0..n 664052 | ... 664054 |
| | | | | Inclusion Exclusion Code 664056 | 0..1 664058 | Inclusion ExclusionCode 664060 |

FIG. 664-3

| Package | level 1 | level 2 | level 3 | level 4 | Cardinality | Datatype Name |
|---|---|---|---|---|---|---|
| | | | | Interval Boundary TypeCode 664062 | 1 664064 | IntervalBoundary TypeCode 664066 |
| | | | | Lower Boundary Location TypeCode 664068 | 0..1 664070 | Location TypeCode 664072 |
| | | | | Upper Boundary Location TypeCode 664074 | 0..1 664076 | Location TypeCode 664078 |

FIG. 665-1

| Package | level 1 | level 2 | level 3 | level 4 | Cardinality | Datatype Name |
|---|---|---|---|---|---|---|
| SupplyPlanningArea ByLocationIDAnd LocationTypeCode ResponseMessage 665000 | SupplyPlanningArea ByLocationIDAnd LocationTypeCode ResponseMessage 665002 | | | | | SupplyPlanningArea ByLocationIDAnd LocationTypeCode ResponseMessage 665004 |
| MessageHeader 665006 | | Message Header 665008 | | | 1 665010 | BusinessDocument MessageHeader 665012 |
| Supply PlanningArea 665014 | | Supply PlanningArea 665016 | | | 0..n 665018 | ... |
| | | | ID 665020 | | 1 665022 | Supply PlanningAreaID 665024 |
| | | | Stocking ProfileCode 665026 | | 0..1 665028 | Stocking ProfileCode 665030 |
| | | | Destocking ProfileCode 665032 | | 0..1 665034 | Destocking ProfileCode 665036 |

FIG. 665-2

| Package | level 1 | level 2 | level 3 | level 4 | Cardinality | Datatype Name |
|---|---|---|---|---|---|---|
| | | | Location 665038 | | 1 665040 | ... 665042 |
| | | | | InternalID 665044 | 1 665046 | Location InternalID 665048 |
| | | | | TypeCode 665050 | 1 665052 | Location TypeCode 665054 |
| | | | Property 665056 | | 0..n 665058 | ... |
| | | | | ID 665060 | 1 665062 | PropertyID 665064 |
| | | | | Value 665066 | 1 665068 | PropertyValue 665070 |
| Log 665072 | | Log 665074 | | | 1 665076 | Log 665078 |

FIG. 666

| Package | level 1 | level 2 | level 3 | Cardinality | Datatype Name |
|---|---|---|---|---|---|
| SupplyPlanningAreaByLocationIDQueryMessage_sync 666000 | SupplyPlanningAreaByLocationIDQueryMessage_sync 666002 | | | | SupplyPlanningAreaByLocationIDQueryMessage_sync 666004 |
| Selection 666006 | | SupplyPlanningAreaSelectionByLocationID 666008 | | 1 666010 | … |
| | | | LocationInternalID 666012 | 1 666014 | LocationInternalID 666016 |
| | | | LocationTypeCode 666018 | 0..1 666020 | LocationTypeCode 666022 |

FIG. 667-1

| Package | level 1 | level 2 | level 3 | level 4 | Cardinality | Datatype Name |
|---|---|---|---|---|---|---|
| SupplyPlanningArea ByLocationID ResponseMessage_sync 667000 | SupplyPlanningArea ByLocationID ResponseMessage_sync 667002 | | | | | SupplyPlanningArea ByLocationID ResponseMessage_sync 667004 |
| SupplyPlanningArea 667006 | | Supply PlanningArea 667008 | | | 0..1 667010 | ... |
| | | | ID 667012 | | 1 667014 | SupplyPlanningAreaID 667016 |
| | | | Stocking ProfileCode 667018 | | 0..1 667020 | StockingProfileCode 667022 |
| | | | Stocking ProfileName 667024 | | 0..1 667026 | LEN40_Name 667028 |
| | | | Destocking ProfileCode 667030 | | 0..1 667032 | DestockingProfileCode 667034 |

FIG. 667-2

| Package | level 1 | level 2 | level 3 | level 4 | Cardinality | Datatype Name |
|---|---|---|---|---|---|---|
| | | | Destocking ProfileName 667036 | | 0..1 667038 | LEN40_Name 667040 |
| | | | Location 667042 | | 1 667044 | ... 667046 |
| | | | | InternalID 667048 | 1 667050 | LocationInternalID 667052 |
| | | | | TypeCode 667054 | 1 667056 | LocationTypeCode 667058 |
| | | | | TypeName 667060 | 1 667062 | LEN60_Name 667064 |
| | | | Property 667066 | | 0..n 667068 | ... |
| | | | | ID 667070 | 1 667072 | PropertyID 667074 |
| | | | | Value 667076 | 1 667078 | PropertyValue 667080 |

FIG. 667-3

| Package | level 1 | level 2 | level 3 | level 4 | Cardinality | Datatype Name |
|---|---|---|---|---|---|---|
| Log 667082 | | Log 667084 | | | 1 667086 | Log 667088 |

FIG. 668

| Package | level 1 | level 2 | level 3 | Cardinality | Datatype Name |
|---|---|---|---|---|---|
| SupplyPlanningArea ChangeConfirmation Message_sync 668000 | SupplyPlanningArea ChangeConfirmation Message_sync 668002 | | | | SupplyPlanningArea ChangeConfirmation Message_sync 668004 |
| Supply PlanningArea 668006 | | SupplyPlanningArea 668008 | | 0..1 668010 | ... |
| | | | ID 668012 | 1 668014 | SupplyPlanningAreaID 668016 |
| Log 668018 | | Log 668020 | | 1 668022 | Log 668024 |

FIG. 669-1

| Package | level 1 | level 2 | level 3 | level 4 | Cardinality | Datatype Name |
|---|---|---|---|---|---|---|
| SupplyPlanningArea ChangeRequest Message_sync 669000 | SupplyPlanningArea ChangeRequest Message_sync 669002 | | | | | SupplyPlanningArea ChangeRequest Message_sync 669004 |
| Supply PlanningArea 669006 | | Supply PlanningArea 669008 | | | 1 669010 | ... |
| | | | ID 669012 | | 1 669014 | SupplyPlanningAreaID 669016 |
| | | | Stocking ProfileCode 669018 | | 0..1 669020 | StockingProfileCode 669022 |
| | | | Destocking ProfileCode 669024 | | 0..1 669026 | DestockingProfileCode 669028 |
| | | | Property 669030 | | 0..n 669032 | ... |
| | | | | ID 669034 | 1 669036 | PropertyID 669038 |

FIG. 669-2

| Package | level 1 | level 2 | level 3 | level 4 | Cardinality | Datatype Name |
|---|---|---|---|---|---|---|
| | | | | Value 669040 | 1 669042 | PropertyValue 669044 |

FIG. 670

| Package | level 1 | level 2 | level 3 | Cardinality | Datatype Name |
|---|---|---|---|---|---|
| SupplyPlanningArea CreateConfirmation Message_sync 670000 | SupplyPlanningArea CreateConfirmation Message_sync 670002 | | | | SupplyPlanningArea CreateConfirmation Message_sync 670004 |
| Supply PlanningArea 670006 | | Supply PlanningArea 670008 | | 0..1 670010 | ... |
| | | | ID 670012 | 1 670014 | SupplyPlanningAreaID 670016 |
| Log 670018 | | Log 670020 | | 1 670022 | Log 670024 |

FIG. 671-1

| Package | level 1 | level 2 | level 3 | level 4 | Cardinality | Datatype Name |
|---|---|---|---|---|---|---|
| SupplyPlanningArea CreateRequest Message_sync 671000 | SupplyPlanningArea CreateRequest Message_sync 671002 | | | | | SupplyPlanningArea CreateRequest Message_sync 671004 |
| Supply PlanningArea 671006 | | Supply PlanningArea 671008 | | | 1 671010 | ... |
| | | | ID 671012 | | 1 671014 | SupplyPlanningAreaID 671016 |
| | | | Stocking ProfileCode 671018 | | 0..1 671020 | StockingProfileCode 671022 |
| | | | Destocking ProfileCode 671024 | | 0..1 671026 | DestockingProfileCode 671028 |
| | | | Location 671030 | | 1 671032 | ... 671034 |
| | | | | InternalID 671036 | 1 671038 | LocationInternalID 671040 |

FIG. 671-2

| Package | level 1 | level 2 | level 3 | level 4 | Cardinality | Datatype Name |
|---|---|---|---|---|---|---|
| | | | | TypeCode 671042 | 0..1 671044 | LocationTypeCode 671046 |
| | | | Property 671048 | | 0..n 671050 | ... |
| | | | | ID 671052 | 1 671054 | PropertyID 671056 |
| | | | | Value 671058 | 1 671060 | PropertyValue 671062 |

FIG. 672

| Package | level 1 | level 2 | level 3 | Cardinality | Datatype Name |
|---|---|---|---|---|---|
| SupplyPlanningArea DeactivateConfirmation Message_sync 672000 | SupplyPlanningArea DeactivateConfirmation Message_sync 672002 | | | | SupplyPlanningArea DeactivateConfirmation Message_sync 672004 |
| SupplyPlanningArea 672006 | | Supply PlanningArea 672008 | | 0..1 672010 | ... |
| | | | ID 672012 | 1 672014 | SupplyPlanningAreaID 672016 |
| Log 672018 | | Log 672020 | | 1 672022 | Log 672024 |

FIG. 673

| Package | level 1 | level 2 | level 3 | Cardinality | Datatype Name |
|---|---|---|---|---|---|
| SupplyPlanningArea DeactivateRequest Message_sync 673000 | SupplyPlanningArea DeactivateRequest Message_sync 673002 | | | | SupplyPlanningArea DeactivateRequest Message_sync 673004 |
| Supply PlanningArea 673006 | | SupplyPlanningArea 673008 | | 1 673010 | ... |
| | | | ID 673012 | 1 673014 | SupplyPlanningAreaID 673016 |

FIG. 675-1

| Package | level 1 | level 2 | level 3 | level 4 | Cardinality | Datatype Name |
|---|---|---|---|---|---|---|
| TradeItem Catalogue Template 675000 | TradeItem CatalogueTemplate 675002 | | | | | TradeItem Catalogue Template 675004 |
| Message Header 675006 | | Message Header 675008 | | | 1 675010 | Business Document Message Header 675012 |
| TradeItem Catalogue 675014 | | TradeItem Catalogue 675016 | | | 1..n 675018 | |
| | | | @actionCode 675020 | | 1 675022 | ActionCode 675024 |
| | | | Creation DateTime 675026 | | 1 675028 | GLOBAL_ DateTime 675030 |
| | | | LastUpdate Date 675032 | | 0..1 675034 | Date 675036 |

FIG. 675-2

| Package | level 1 | level 2 | level 3 | level 4 | Cardinality | Datatype Name |
|---|---|---|---|---|---|---|
| | | | CatalogueID 675038 | | 1 675040 | CatalogueID 675042 |
| | | | Content VersionID 675044 | | 0..1 675046 | VersionID 675048 |
| | | | Document Structure VersionID 675050 | | 0..1 675052 | VersionID 675054 |
| Party 675056 | | | Recipient Party 675058 | | 1 675060 | Business Transaction Document Party 675062 |
| | | | SourceParty 675064 | | 1 675066 | Business Transaction Document Party 675068 |

FIG. 675-3

| Package | level 1 | level 2 | level 3 | level 4 | Cardinality | Datatype Name |
|---|---|---|---|---|---|---|
| | | | DataCreatorParty 675070 | | 1 675072 | Business Transaction Document Party 675074 |
| | | | ContentOwnerParty 675076 | | 1 675078 | Business Transaction Document Party 675080 |
| Item 675082 | | | Item 675084 | | 0..n 675086 | |
| | | | | @actionCode 675088 | 0..1 675090 | ActionCode 675092 |
| | | | | @propertyValuationListCompleteTransmissionIndicator 675094 | 0..1 675096 | CompleteTransmissionIndicator 675098 |

FIG. 675-4

| Package | level 1 | level 2 | level 3 | level 4 | Cardinality | Datatype Name |
|---|---|---|---|---|---|---|
| | | | | Catalogue ItemID 6750100 | 1 6750102 | Catalogue ItemID 6750104 |
| | | | | Property Valuation 6750106 | 0..n 6750108 | Property Valuation 6750110 |
| Log 6750112 | | Log 6750114 | | | 1 6750116 | Log 6750118 |

CONSISTENT SET OF INTERFACES DERIVED FROM A BUSINESS OBJECT MODEL

RELATED APPLICATION

This application claims the benefit of U.S. Provisional Application No. 60/837,196 filed Aug. 11, 2006 and fully incorporates the contents therein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter described herein relates generally to the generation and use of consistent interfaces derived from a business object model. More particularly, the present disclosure relates to the generation and use of consistent interfaces that are suitable for use across industries, across businesses, and across different departments within a business.

BACKGROUND

Transactions are common among businesses and between business departments within a particular business. During any given transaction, these business entities exchange information. For example, during a sales transaction, numerous business entities may be involved, such as a sales entity that sells merchandise to a customer, a financial institution that handles the financial transaction, and a warehouse that sends the merchandise to the customer. The end-to-end business transaction may require a significant amount of information to be exchanged between the various business entities involved. For example, the customer may send a request for the merchandise as well as some form of payment authorization for the merchandise to the sales entity, and the sales entity may send the financial institution a request for a transfer of funds from the customer's account to the sales entity's account.

Exchanging information between different business entities is not a simple task. This is particularly true because the information used by different business entities is usually tightly tied to the business entity itself. Each business entity may have its own program for handling its part of the transaction. These programs differ from each other because they typically are created for different purposes and because each business entity may use semantics that differ from the other business entities. For example, one program may relate to accounting, another program may relate to manufacturing, and a third program may relate to inventory control. Similarly, one program may identify merchandise using the name of the product while another program may identify the same merchandise using its model number. Further, one business entity may use U.S. dollars to represent its currency while another business entity may use Japanese Yen. A simple difference in formatting, e.g., the use of upper-case lettering rather than lower-case or title-case, makes the exchange of information between businesses a difficult task. Unless the individual businesses agree upon particular semantics, human interaction typically is required to facilitate transactions between these businesses. Because these "heterogeneous" programs are used by different companies or by different business areas within a given company, a need exists for a consistent way to exchange information and perform a business transaction between the different business entities.

The United Nations established the United Nations Centre for Trade Facilitation and Electronic Business ("UN/CEFACT") to improve worldwide coordination for the exchange of information. The primary focus of UN/CEFACT is to facilitate national and international transactions by simplifying and harmonizing processes, procedures and information flow to contribute to the growth of global commerce. UN/CEFACT is still attempting to develop such a harmonized system. In fact, as can be found at www.unece.org/cefact/, organizational changes, a change in organization name and experience gained from operating the Centre resulted in multiple revisions to the original document, the last being approved by UN/CEFACT in May 2004.

Currently, many standards exist that offer a variety of interfaces used to exchange business information. Most of these interfaces, however, apply to only one specific industry and are not consistent between the different standards. Moreover, a number of these interfaces are not consistent within an individual standard.

SUMMARY

Methods and systems consistent with the subject matter described herein facilitate ecommerce by providing consistent interfaces that can be used during a business transaction. Such business entities may include different companies within different industries. For example, one company may be in the chemical industry, while another company may be in the automotive industry. The business entities also may include different businesses within a given industry, or they may include different departments within a given company.

The interfaces are consistent across different industries and across different business units because they are generated using a single business object model. The business object model defines the business-related concepts at a central location for a number of business transactions. In other words, the business object model reflects the decisions made about modeling the business entities of the real world acting in business transactions across industries and business areas. The business object model is defined by the business objects and their relationships to each other (overall net structure).

A business object is a capsule with an internal hierarchical structure, behavior offered by its operations, and integrity constraints. Business objects are semantically disjointed, i.e., the same business information is represented once. The business object model contains all of the elements in the messages, user interfaces and engines for these business transactions. Each message represents a business document with structured information. The user interfaces represent the information that the users deal with, such as analytics, reporting, maintaining or controlling. The engines provide services concerning a specific topic, such as pricing or tax.

Methods and systems consistent with the subject matter described herein generate interfaces from the business object model by assembling the elements that are required for a given transaction in a corresponding hierarchical manner. Because each interface is derived from the business object model, the interface is consistent with the business object model and with the other interfaces that are derived from the business object model. Moreover, the consistency of the interfaces is also maintained at all hierarchical levels. By using consistent interfaces, each business entity can easily exchange information with another business entity without the need for human interaction, thus facilitating business transactions.

Example methods and systems described herein provide an object model and, as such, derive two or more interfaces that are consistent from this object model. Further, the subject matter described herein can provide a consistent set of interfaces that are suitable for use with more than one industry. This consistency is reflected at a structural level as well as through the semantic meaning of the elements in the interfaces. Additionally, the techniques and components described herein provide a consistent set of interfaces suitable for use with different businesses. Methods and systems consistent with the subject matter described herein provide a consistent set of interfaces suitable for use with a business scenario that spans across the components within a company. These components, or business entities, may be heterogeneous.

For example, a user or a business application of any number of modules, including one may execute or otherwise implement methods that utilize consistent interfaces that, for example, query business objects, respond to the query, create/change/delete/cancel business objects, and/or confirm the particular processing, often across applications, systems, businesses, or even industries. The foregoing example computer implementable methods—as well as other disclosed processes—may also be executed or implemented by or within software. Moreover, some or all of these aspects may be further included in respective systems or other devices for identifying and utilizing consistence interfaces. For example, one system implementing consistent interfaces derived from a business object model may include memory storing a plurality of global data types and at least a subset of AdvertisingIssue, AppropriationRequest, BusinessProcessInternalControl, CapacityLoadPlanningView, CustomerQuote for Customer Relationship Management (CRM), CustomerQuote for Enterprise Resource Planning (ERP), CustomerRequirement, CustomerReturn, EquipmentResource, FundsManagementAccount, GoodsMovement, InternalControlSignoff, MaintenanceIssueCategoryCatalogue, MaintenanceOrder, ManagementControlAssessment, Material, MaterialInspection, MaterialInspectionSample, PaymentCardPaymentAuthorisation, ProcurementPlanningOrder, ProductionBillOfMaterial, ProductionConfirmation, ProductionOrder, ProductionPlanningOrder for ERP, ProductionPlanningOrder for Supply. Chain Management (SCM), ProductionProposal, Project, Project Change, ProjectIssueCategoryCatalogue, QualityIssueCategoryCatalog, QualityIssueNotification, RepetitiveManufacturingConfirmation, SalesOrder, StockTransportPlanningOrder, StrategicInvestmentBuy, SupplyPlanningArea, and TradeItemCatalogue business objects.

The details of these and other aspects and embodiments of the disclosure are set forth in the accompanying drawings and the description below. Other features, objects, and advantages of the various embodiments will be apparent from the description and drawings, as well as from the claims.

BRIEF DESCRIPTION OF THE DRAWINGS

FIGS. 27A-E depict a hierarchization process in accordance with methods and systems consistent with the subject matter described herein;

FIGS. 31-1 through 31-9 show an example AdvertisingIssueSimpleByElementsQueryMessage_sync Element Structure;

FIGS. 32-1 through 32-5 show an example AdvertisingIssueSimpleByElementsResponseMessage_sync Element Structure;

FIG. 46 shows an example Appropriation RequestApprove Confirmation Message_sync Element Structure;

FIG. 47 shows an example Appropriation RequestApprove RequestMessage_sync Element Structure;

FIG. 48 shows an example AppropriationRequestByIDQueryMessage_sync Element Structure;

FIGS. 49-1 through 49-12 show an example AppropriationRequestByIDResponseMessage_sync Element Structure;

FIG. 50 shows an example AppropriationRequestPostponeConfirmationMessage_sync Element Structure;

FIG. 51 shows an example AppropriationRequestPostponeRequestMessage_sync Element Structure;

FIG. 52 shows an example AppropriationRequestRejectConfirmationMessage_sync Element Structure;

FIG. 53 shows an example AppropriationRequestRejectRequestMessage_sync Element Structure;

FIG. 54 shows an example AppropriationRequestVariantByApproverAndInApprovalStatusQueryMessage_sync Element Structure;

FIGS. 55-1 through 55-3 show an example AppropriationRequestVariantByApproverAndInApprovalStatusResponseMessage_sync Element Structure;

FIGS. 56-1 through 56-2 show an example AppropriationRequestVariantPlanValuesByProgrammeAndPlanningVersion_sync Element Structure;

FIGS. 57-1 through 57-3 show an example AppropriationRequestVariantPlanValuesByProgrammeAndPlanningVersionResponseMessage_sync Element Structure;

FIGS. 70-1 through 70-4 show an example CapacityLoadPlanningViewByCapacityLoadPlanningViewResponseMessage_sync Element Structure;

FIGS. 71-1 through 71-2 show an example CapacityLoadPlanningViewByCapacityLoadPlanningViewQueryMessage_sync Element Structure;

FIGS. 72-1 through 72-3 show an example CapacityLoadPlanningViewSimpleByElementsQueryMessage_sync Element Structure;

FIGS. 73-1 through 73-3 show an example CapacityLoadPlanningViewSimpleByElementsResponseMessage_sync Element Structure;

FIG. 83 shows an example CustomerQuoteAcceptanceAcknowledgementConfirmationMessage Element Structure;

FIG. 84 shows an example CustomerQuoteAcceptanceAcknowledgementRequestMessage Element Structure;

FIG. 85 shows an example CustomerQuoteByIDQueryMessage Element Structure;

FIGS. 86-1 through 86-4 show an example CustomerQuoteByIDResponseMessage Element Structure;

FIG. 87 shows an example CustomerQuoteChangeConfirmationMessage Element Structure;

FIGS. 88-1 through 88-4 show an example CustomerQuoteChangeRequestMessage Element Structure;

FIG. 89 shows an example CustomerQuoteCreateConfirmationMessage Element Structure;

FIGS. 90-1 through 90-3 show an example CustomerQuoteCreateRequestMessage Element Structure;

FIG. 99 shows an example CustomerQuoteAllowedUserStatusByProcessingTypeCodeQueryMessage_sync Element Structure;

FIGS. 100-1 through 100-2 show an example CustomerQuoteAllowedUserStatusByProcessingTypeCodeResponseMessage_sync Element Structure;

FIGS. 101-1 through 101-3 show an example CustomerQuoteBasicDataByBasicDataAndUserStatusQueryMessage_sync Element Structure;

FIGS. 102-1 through 102-4 show an example CustomerQuoteBasicDataByBasicDataAndUserStatusResponseMessage_sync Element Structure;

FIGS. 103-1 through 103-2 show an example CustomerQuoteBasicDataByBuyerAndBasicDataQueryMessage_sync Element Structure;

FIGS. 104-1 through 104-5 show an example CustomerQuoteBasicDataByBuyerAndBasicDataResponseMessage_sync Element Structure;

FIG. 105 shows an example CustomerQuoteBasicDataByBuyerAndIncompletenessQueryMessage_sync Element Structure;

FIGS. 106-1 through 106-5 show an example CustomerQuoteBasicDataByBuyerAndIncompletenessResponseMessage_sync Element Structure;

FIGS. 107-1 through 107-2 show an example CustomerQuoteBasicDataByBuyerAndValidityPeriodQueryMessage_sync Element Structure;

FIGS. 108-1 through 108-5 show an example CustomerQuoteBasicDataByBuyerAndValidityPeriodResponseMessage_sync Element Structure;

FIG. 109 shows an example CustomerQuoteByIDQueryMessage_sync Element Structure;

FIGS. 110-1 through 110-12 show an example CustomerQuoteByIDResponseMessage_sync Element Structure;

FIGS. 111-1 through 111-13 show an example CustomerQuoteMessage Element Structure;

FIG. 112 shows an example CustomerQuoteUserStatusChangeConfirmationMessage_sync Element Structure;

FIGS. 113-1 through 113-2 show an example CustomerQuoteUserStatusChangeRequestMessage_sync Element Structure;

FIGS. 118-1 through 118-3 show an example CustomerRequirementAvailabilityConfirmationItemByCustomerRequirementExternalRequestItemIDResponseMessage_sync Message Data Type;

FIG. 119 shows an example CustomerRequirementAvailabilityConfirmationItemCancelRequestMessage_sync Message Data Type;

FIGS. 120-1 through 120-2 show an example CustomerRequirementAvailabilityConfirmationItemChangeRequestMessage_sync Message Data Type;

FIG. 121 shows an example CustomerRequirementAvailabilityConfirmationItemConfirmationMessage_sync Message Data Type;

FIGS. 122-1 through 122-2 show an example CustomerRequirementAvailabilityConfirmationItemCreateRequestMessage_sync Message Data Type;

FIG. 123 shows an example CustomerRequirementByIDQueryMessage_sync Message Data Type;

FIGS. 124-1 through 124-3 show an example CustomerRequirementByIDResponseMessage_sync Message Data Type;

FIG. 125 shows an example CustomerRequirementCancelRequestMessage_sync Message Data Type;

FIGS. 126-1 through 126-3 show an example CustomerRequirementChangeRequestMessage_sync Message Data Type;

FIG. 127 shows an example CustomerRequirementConfirmationMessage_sync Message Data Type;

FIGS. 128-1 through 128-3 show an example CustomerRequirementCreateRequestMessage_sync Message Data Type;

FIG. 129 shows an example CustomerRequirementExternalRequestItemCancelRequestMessage_sync Message Data Type;

Figure 1:
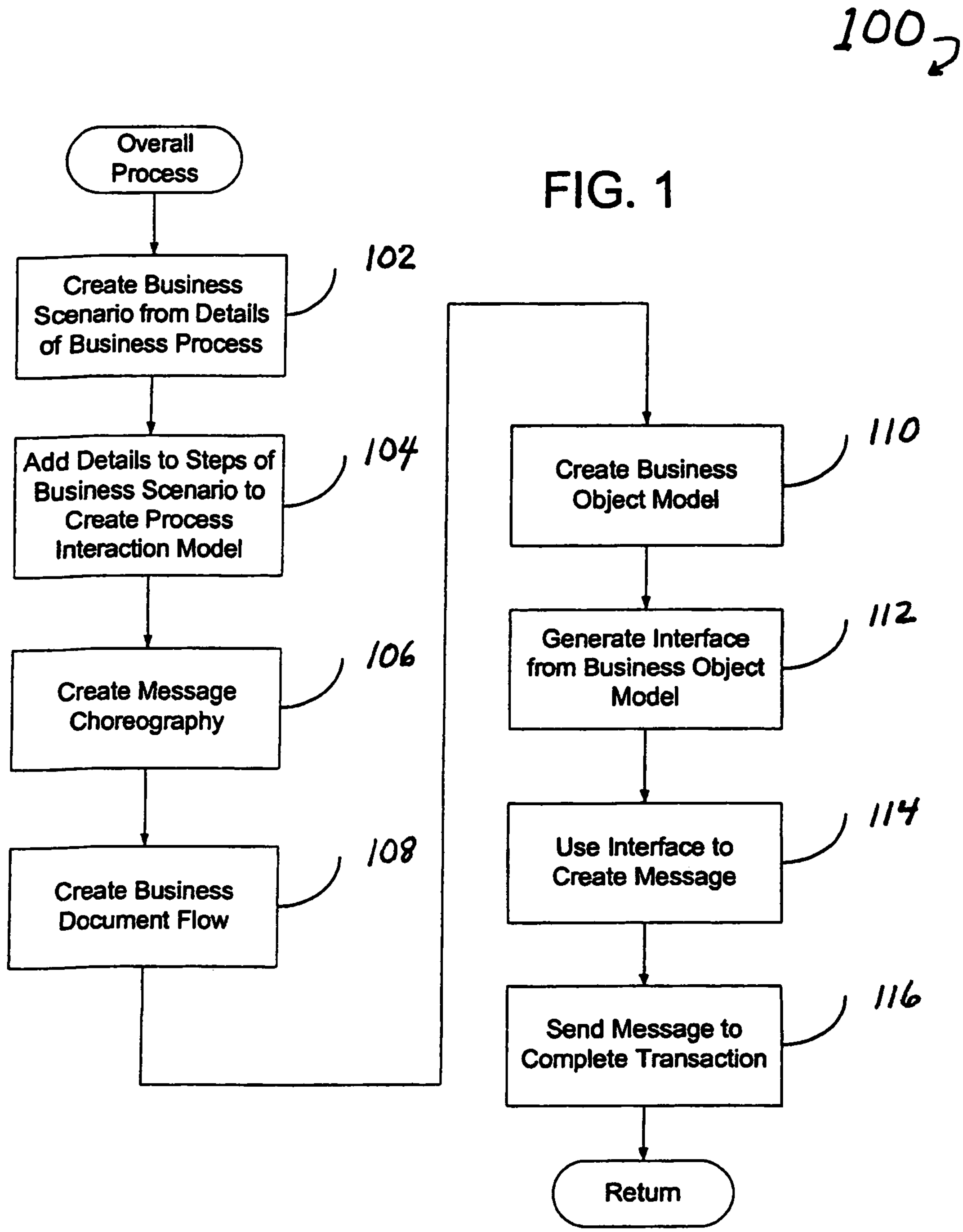
FIG. 1 depicts a flow diagram of the overall steps performed by methods and systems consistent with the subject matter described herein.
Figure 2:
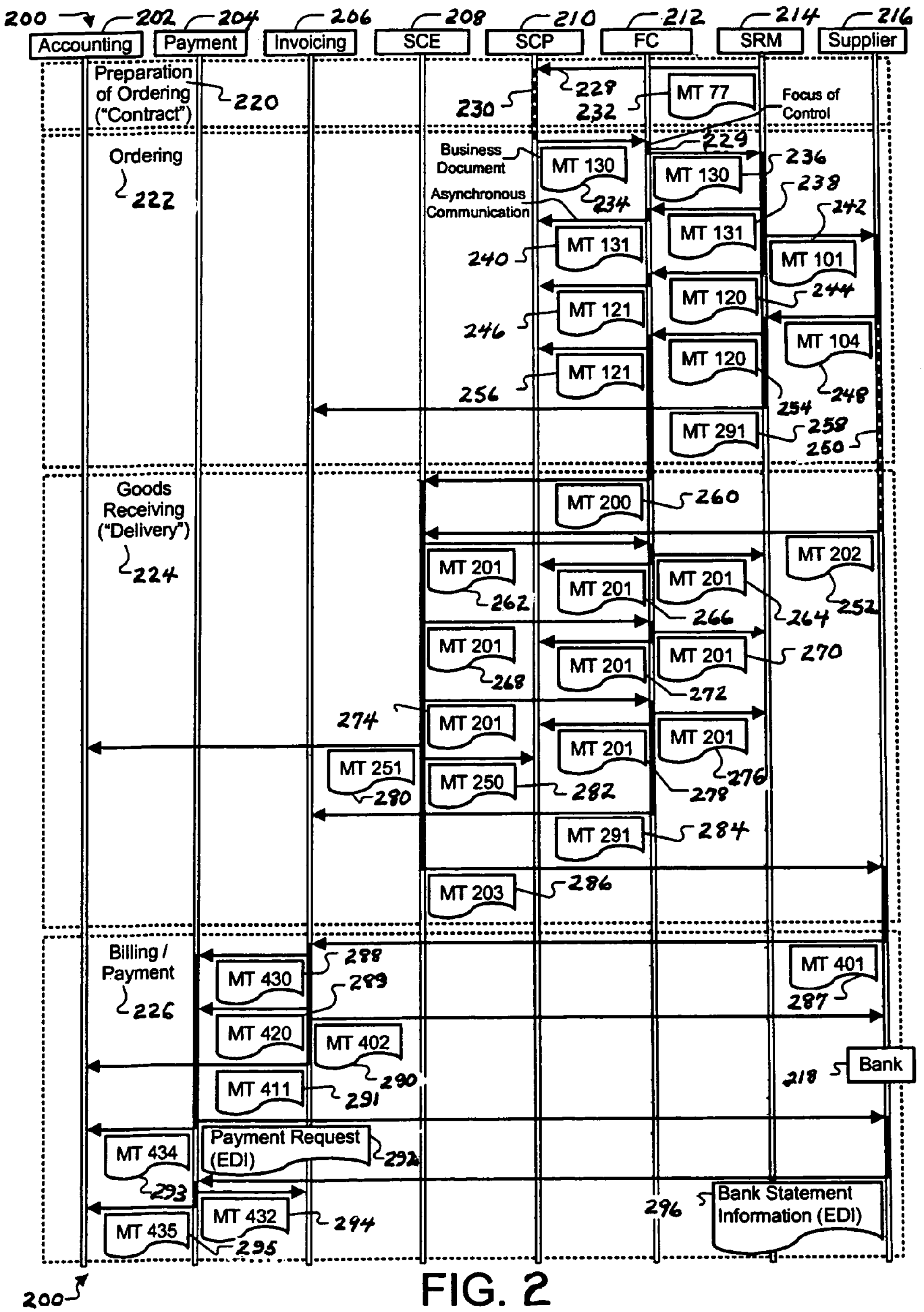
FIG. 2 depicts a business document flow for an invoice request in accordance with methods and systems consistent with the subject matter described herein.
Figure 3:
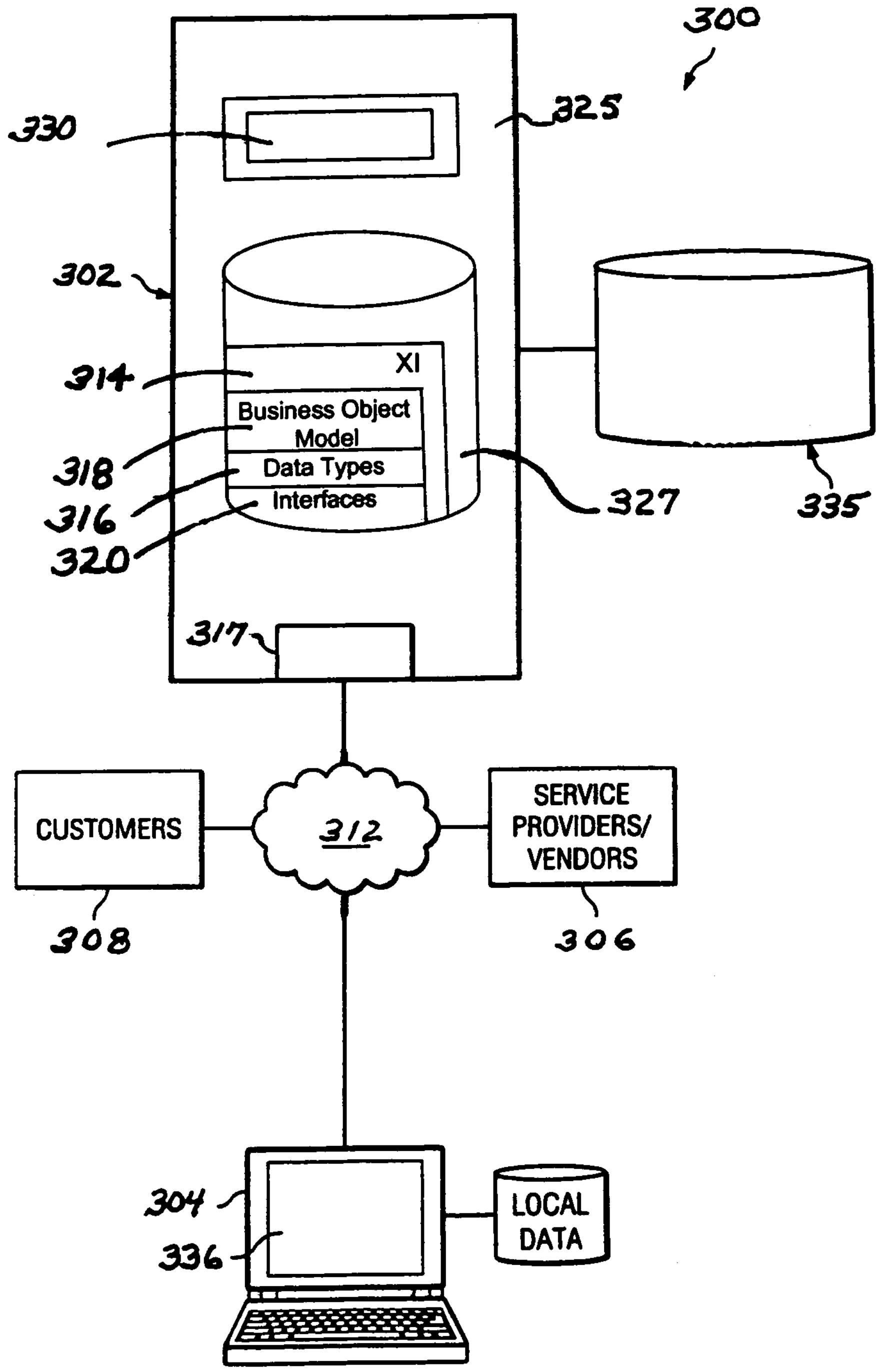
FIG. 3 illustrates an example system for the transmission of data between a client and a hosted software application by an object property setter, in accordance with certain embodiments included in the present disclosure.
Figure 4:
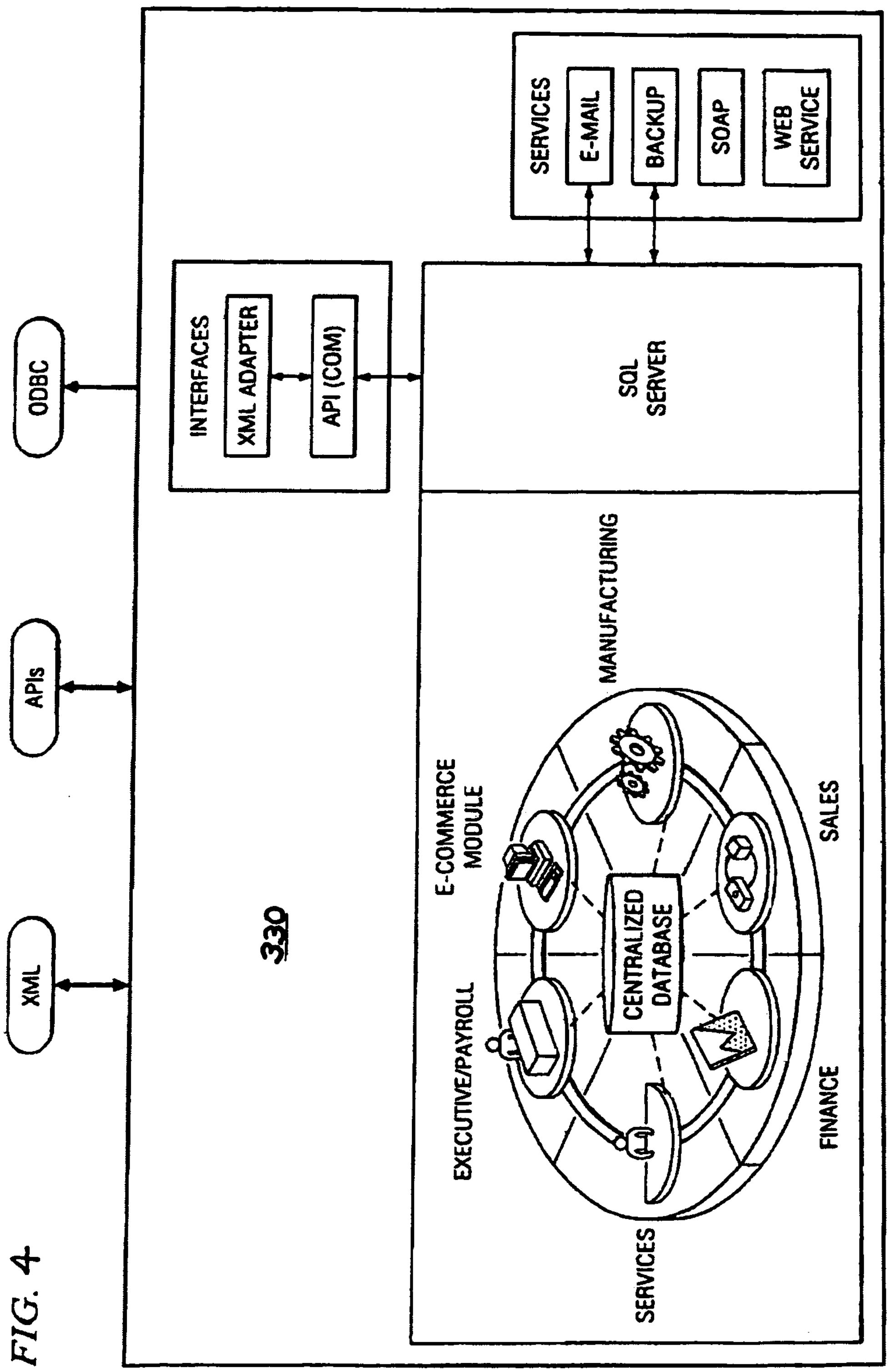
FIG. 4 illustrates an example application implementing certain techniques and components in accordance with one embodiment of the system of FIG. 1.
Figure 6:
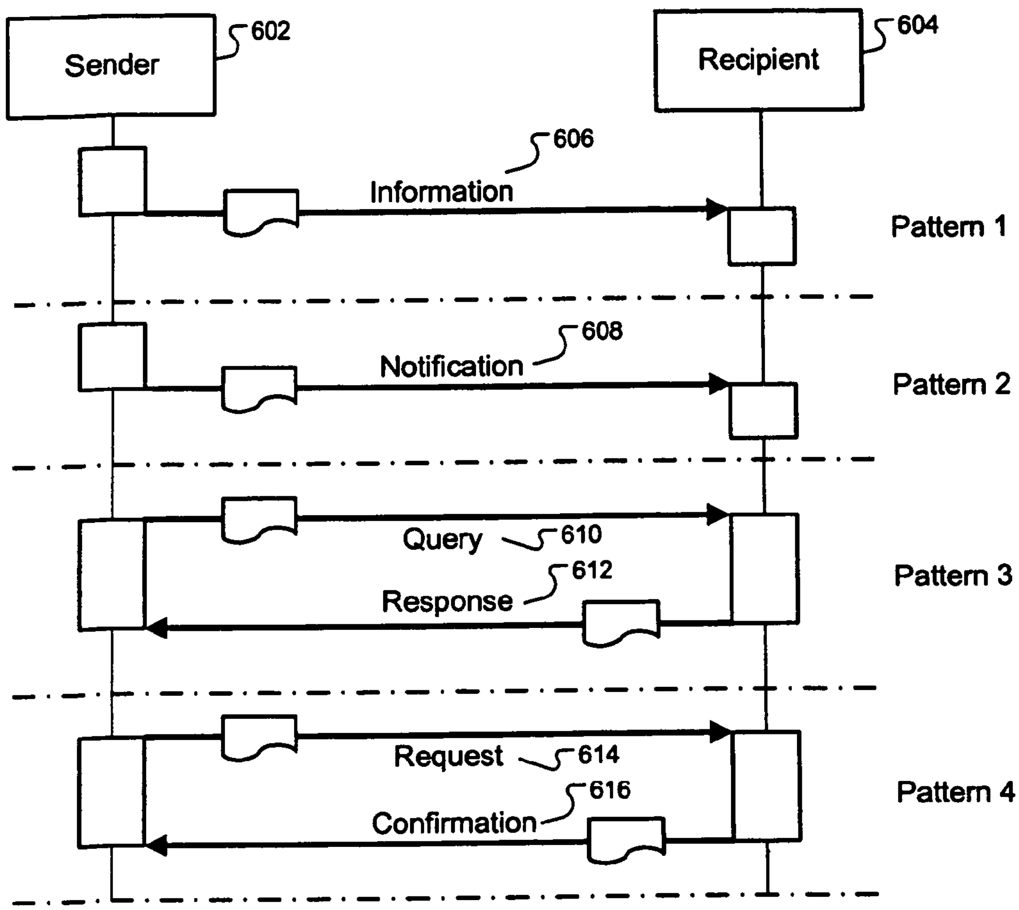
FIG. 6 depicts message categories in accordance with methods and systems consistent with the subject matter described herein.
Figure 7:
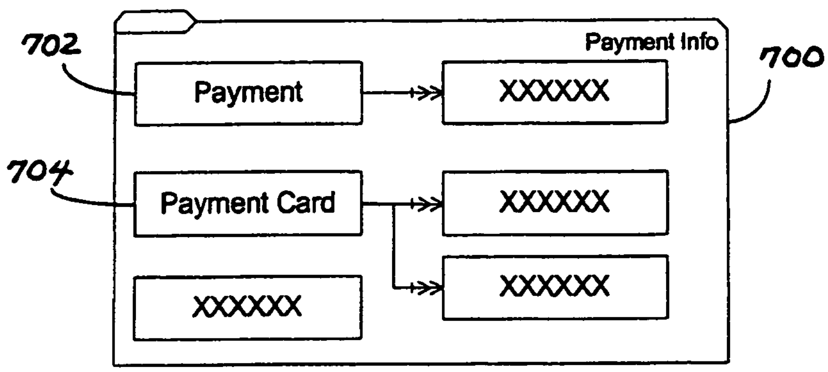
FIG. 7 depicts an example of a package in accordance with methods and systems consistent with the subject matter described herein.
Figure 8:
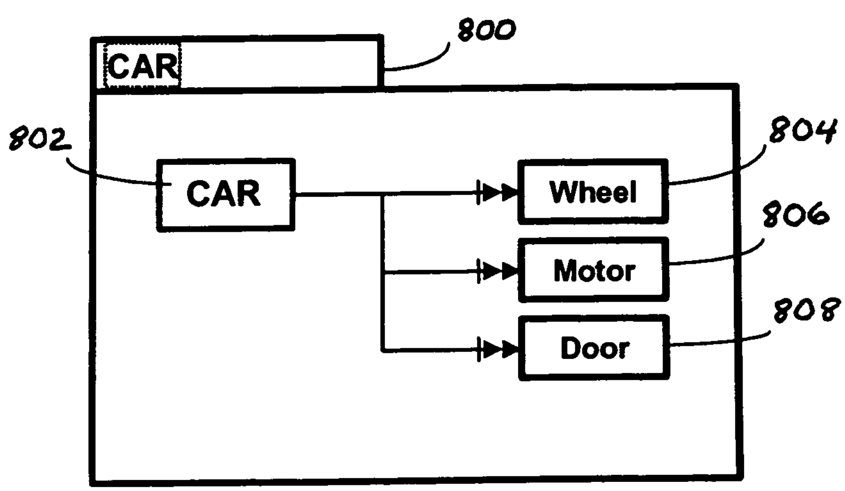
FIG. 8 depicts another example of a package in accordance with methods and systems consistent with the subject matter described herein.
Figure 9:
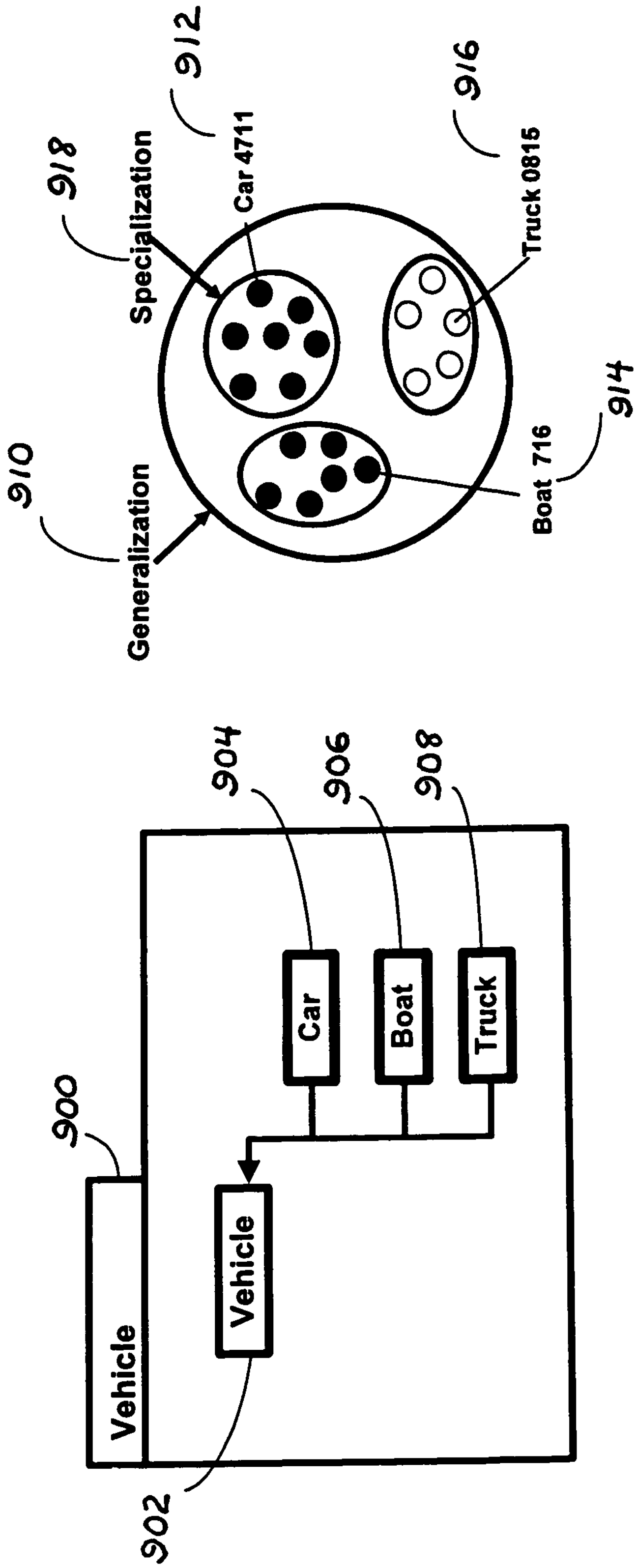
FIG. 9 depicts a third example of a package in accordance with methods and systems consistent with the subject matter described herein.
Figure 10:
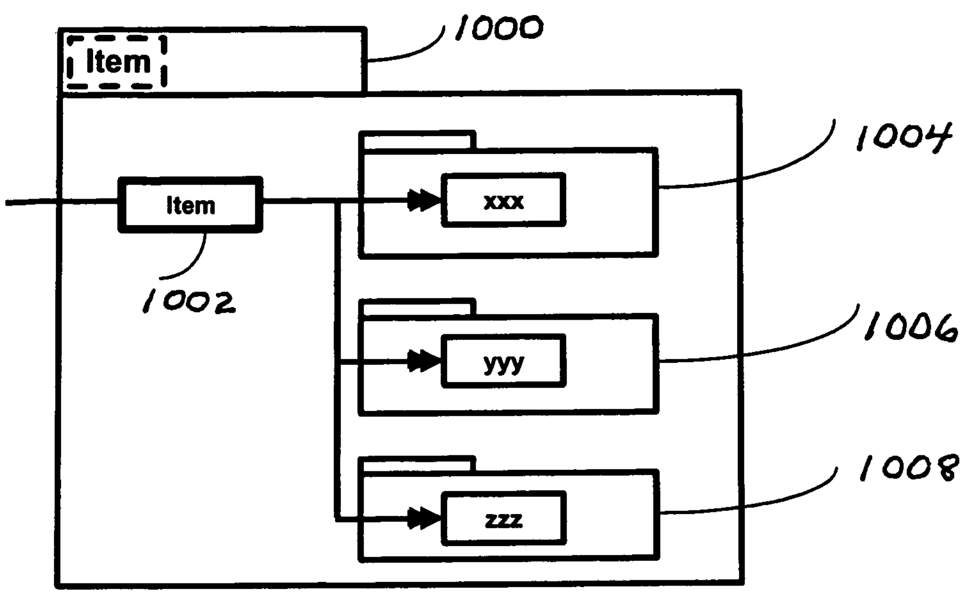
FIG. 10 depicts a fourth example of a package in accordance with methods and systems consistent with the subject matter described herein.
Figure 11:
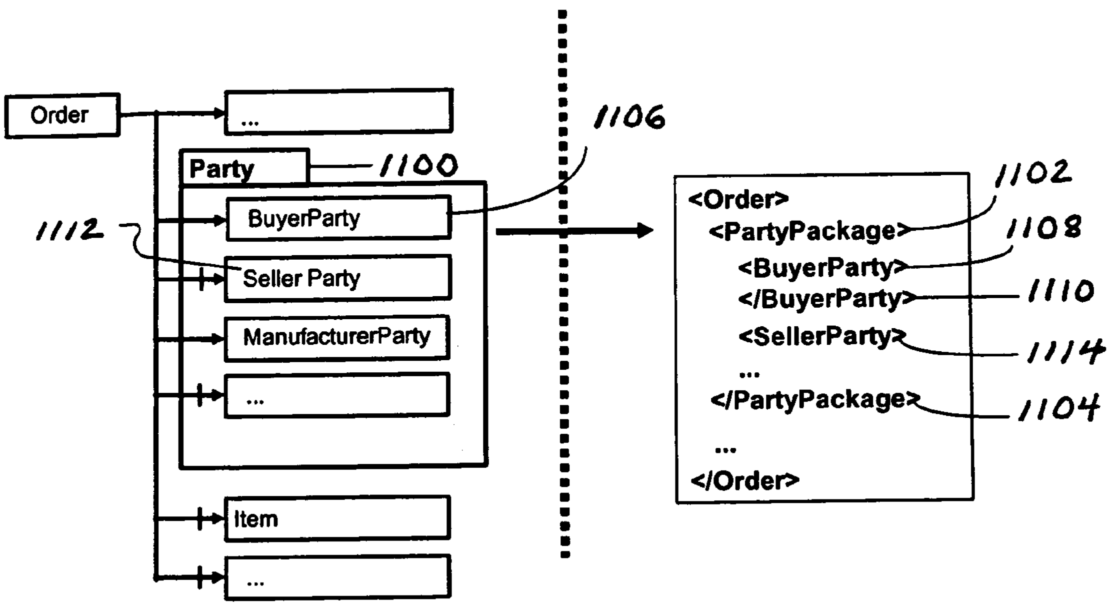
FIG. 11 depicts the representation of a package in the XML schema in accordance with methods and systems consistent with the subject matter described herein.
Figure 12:
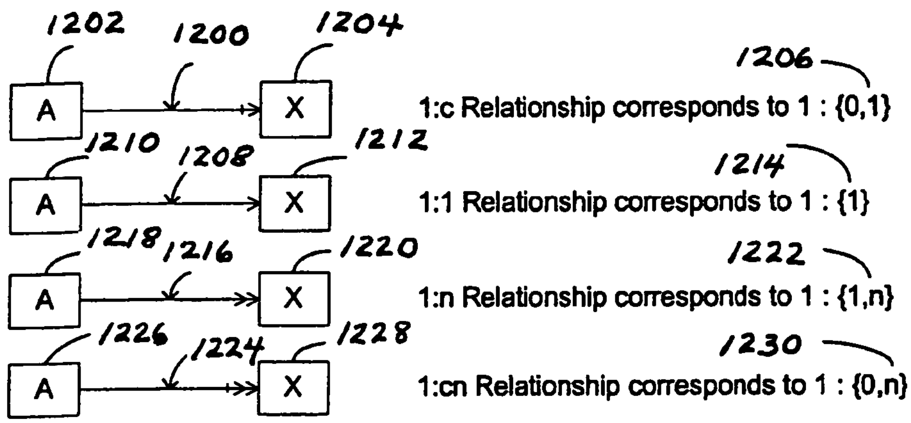
FIG. 12 depicts a graphical representation of cardinalities between two entities in accordance with methods and systems consistent with the subject matter described herein.
Figure 13:
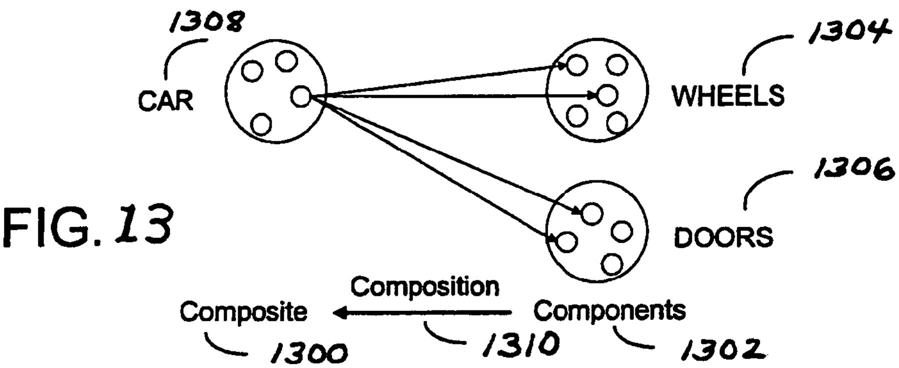
FIG. 13 depicts an example of a composition in accordance with methods and systems consistent with the subject matter described herein.
Figure 14:
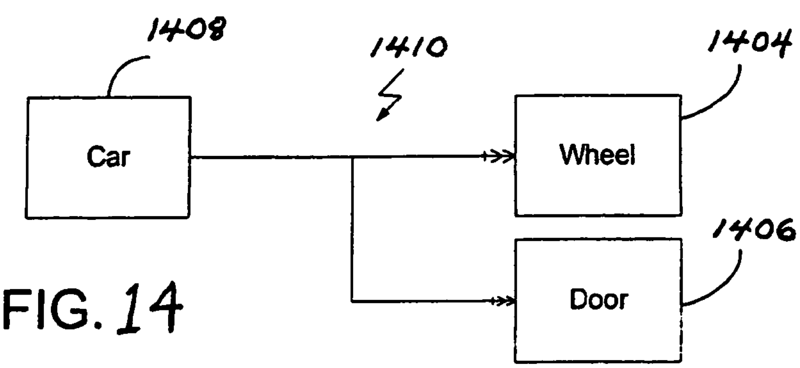
FIG. 14 depicts an example of a hierarchical relationship in accordance with methods and systems consistent with the subject matter described herein.
Figure 16:
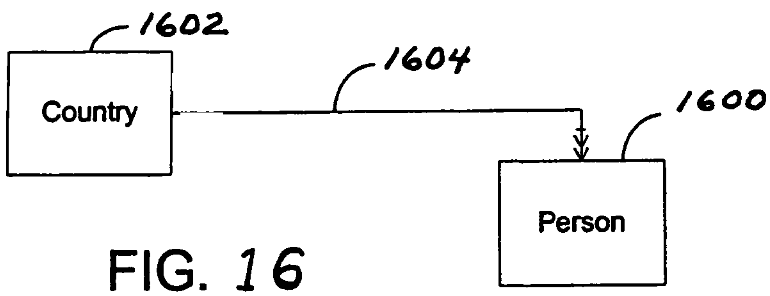
FIG. 16 depicts an example of an association in accordance with methods and systems consistent with the subject matter described herein.
Figure 17:
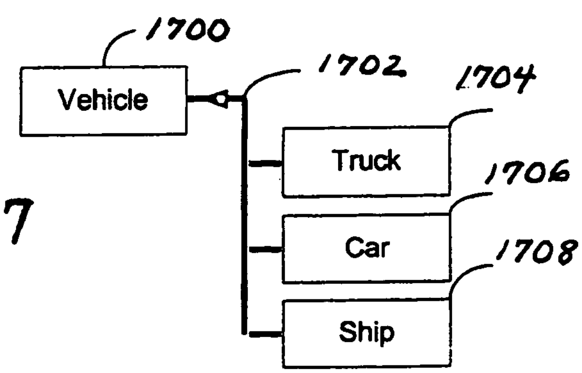
FIG. 17 depicts an example of a specialization in accordance with methods and systems consistent with the subject matter described herein.
Figure 18:
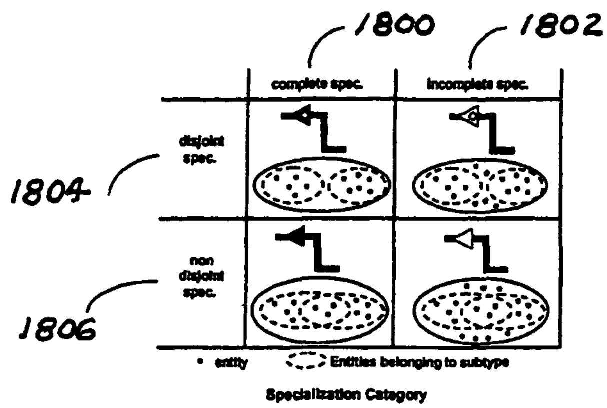
FIG. 18 depicts the categories of specializations in accordance with methods and systems consistent with the subject matter described herein.
Figure 19:
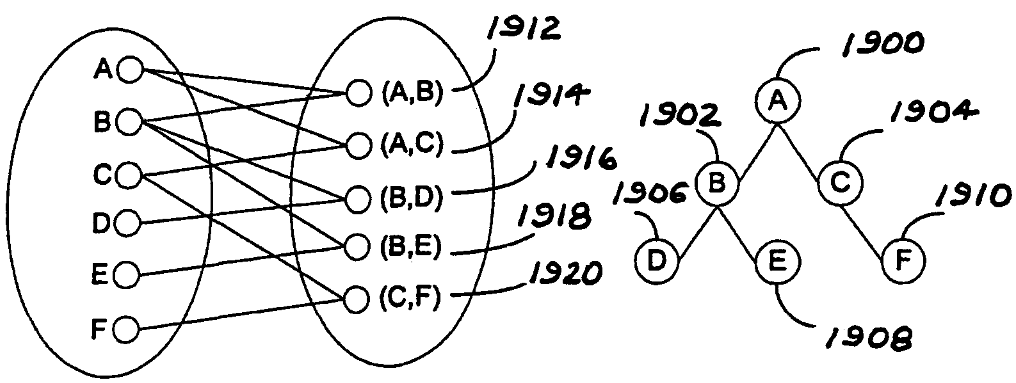
FIG. 19 depicts an example of a hierarchy in accordance with methods and systems consistent with the subject matter described herein.
Figure 20:
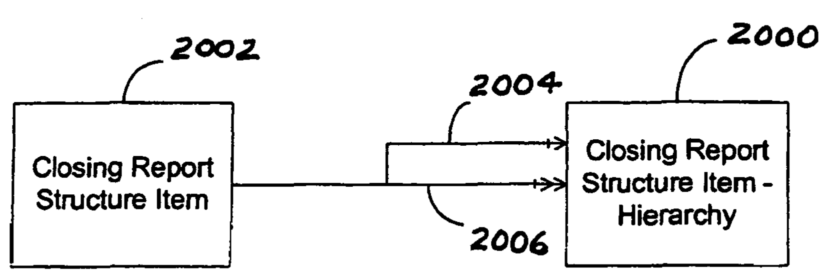
FIG. 20 depicts a graphical representation of a hierarchy in accordance with methods and systems consistent with the subject matter described herein.
Figure 23:
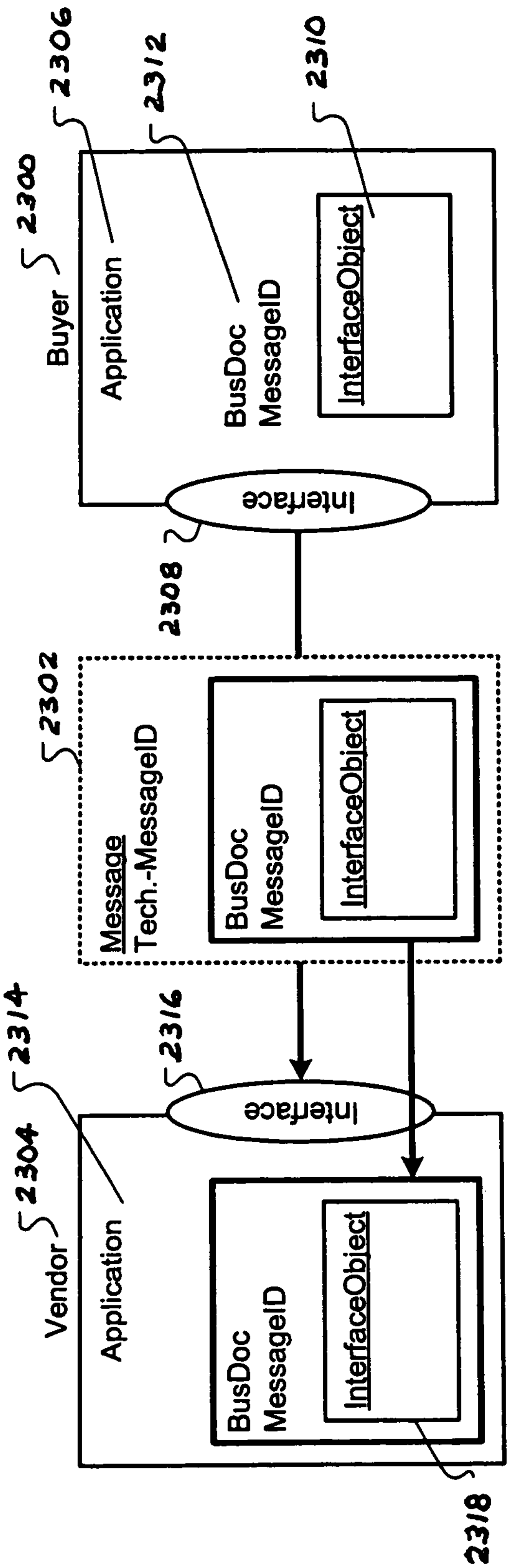
FIG. 23 depicts an example illustrating the transmittal of a business document in accordance with methods and systems consistent with the subject matter described herein.
Figure 24:
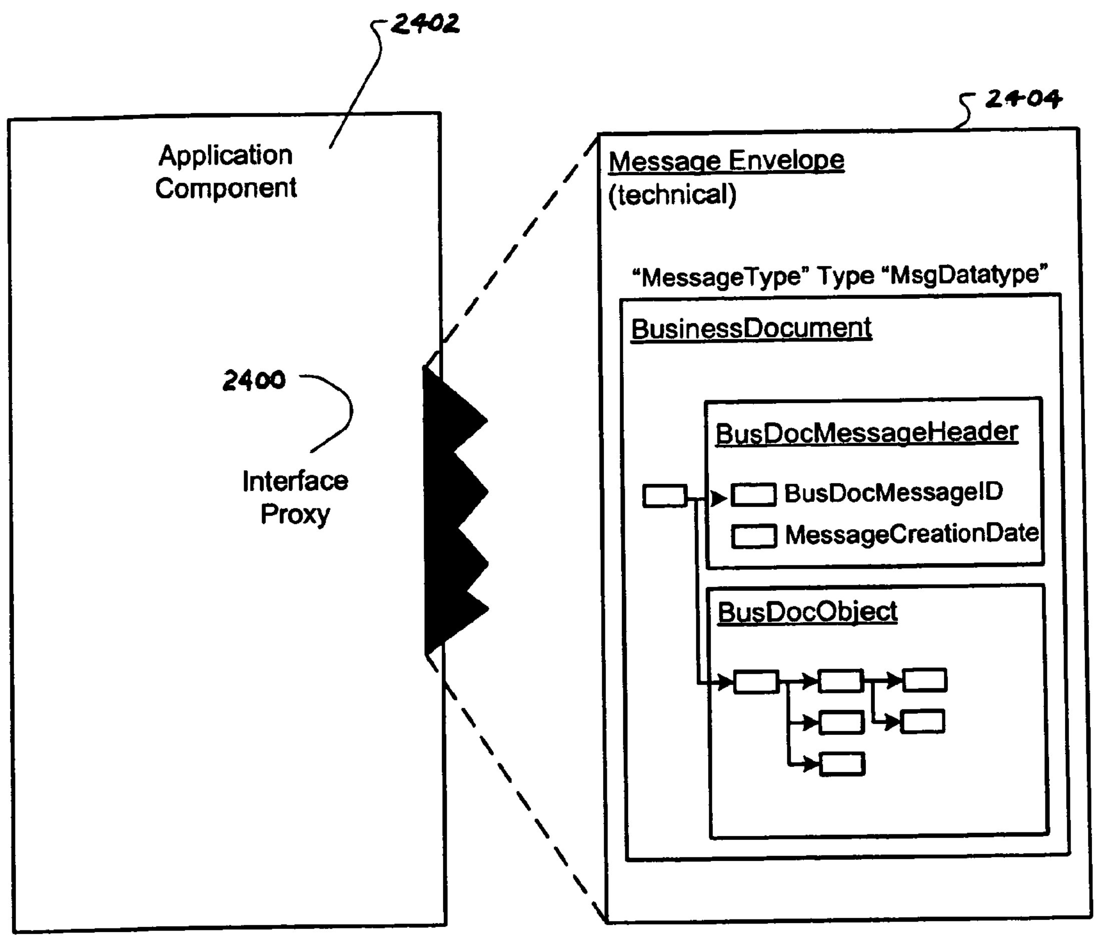
FIG. 24 depicts an interface proxy in accordance with methods and systems consistent with the subject matter described herein.
Figure 28:
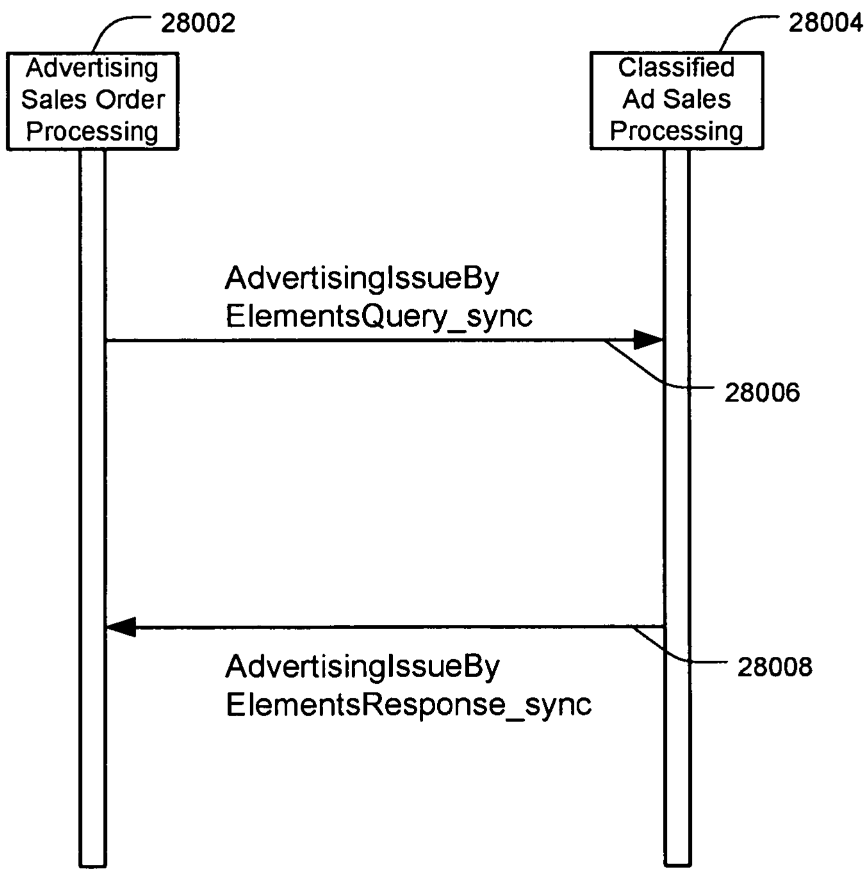
FIG. 28 shows an example AdvertisingIssue Message Choreography.
Figure 37:
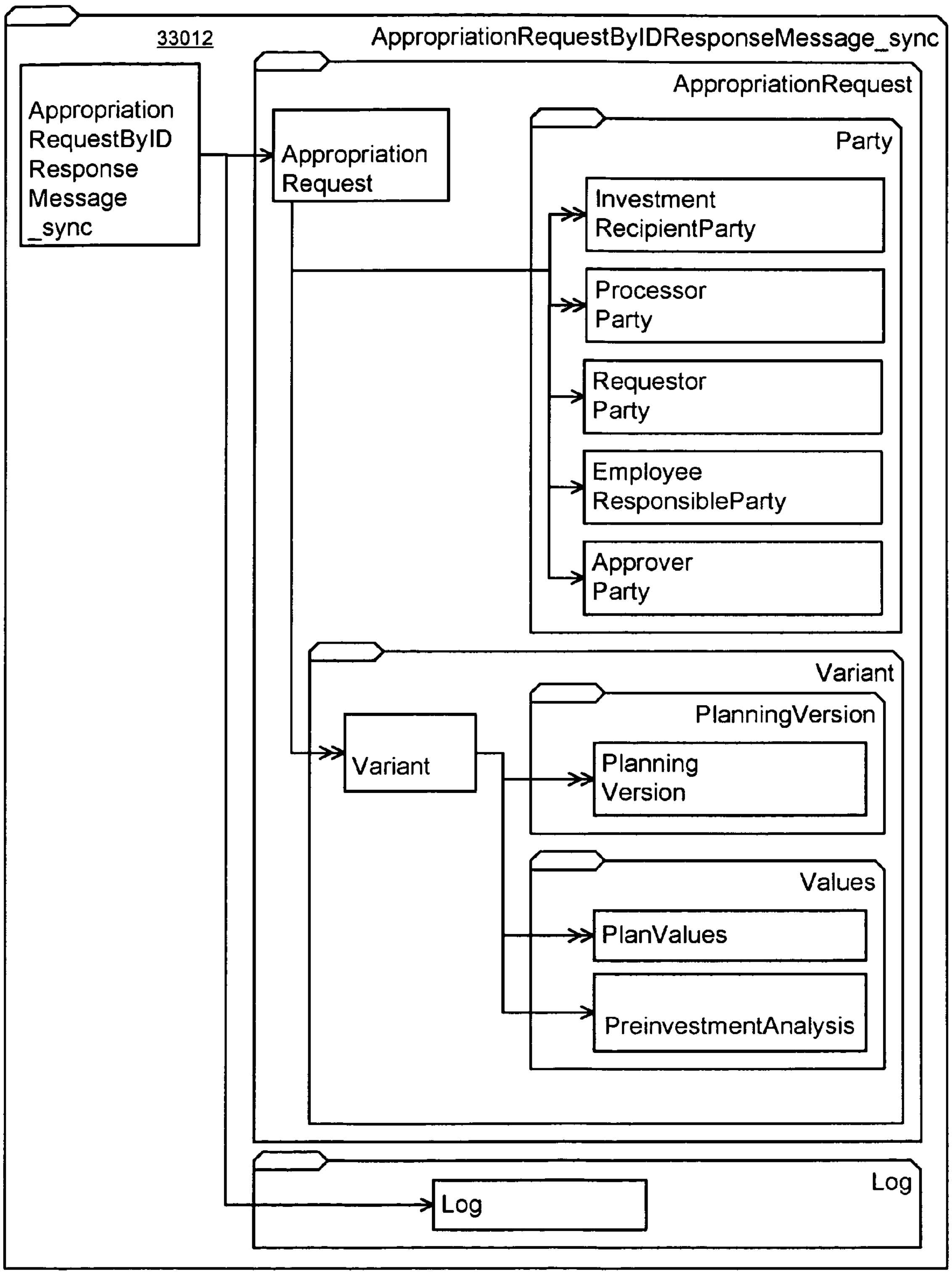
FIG. 37 shows an example AppropriationRequestByIDResponseMessage_sync Message Data Type.
Figure 39:
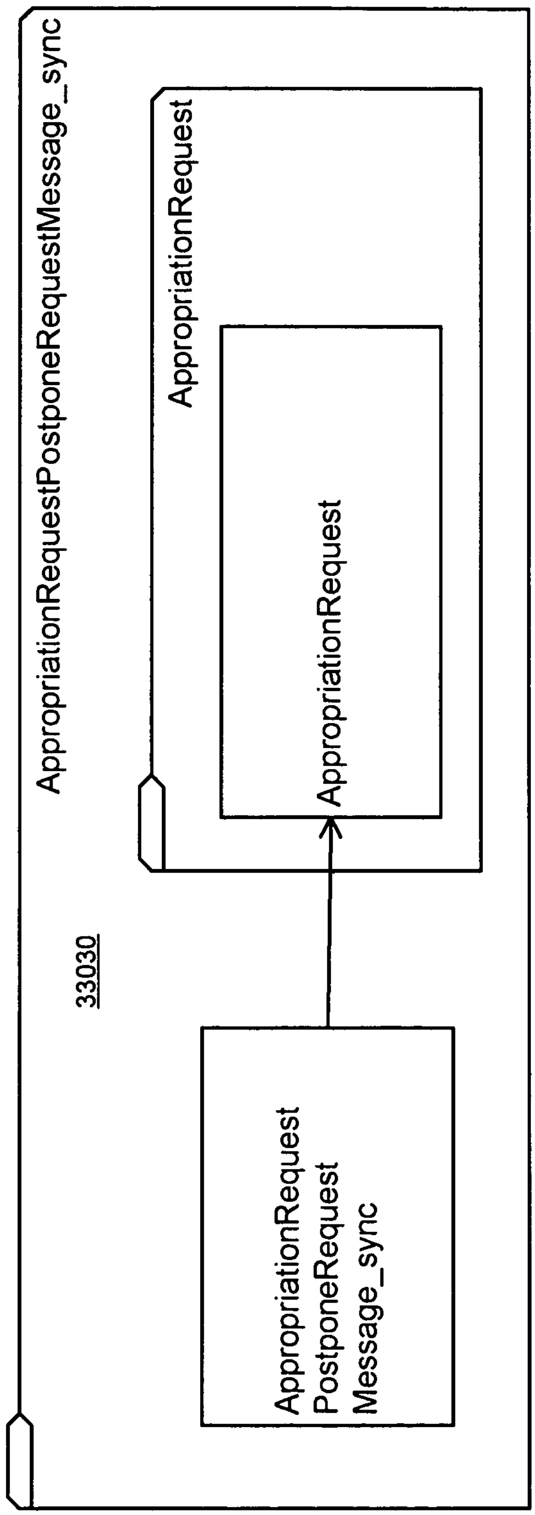
FIG. 39 shows an example AppropriationRequestPostponeRequestMessage_sync Message Data Type.
Figure 130:
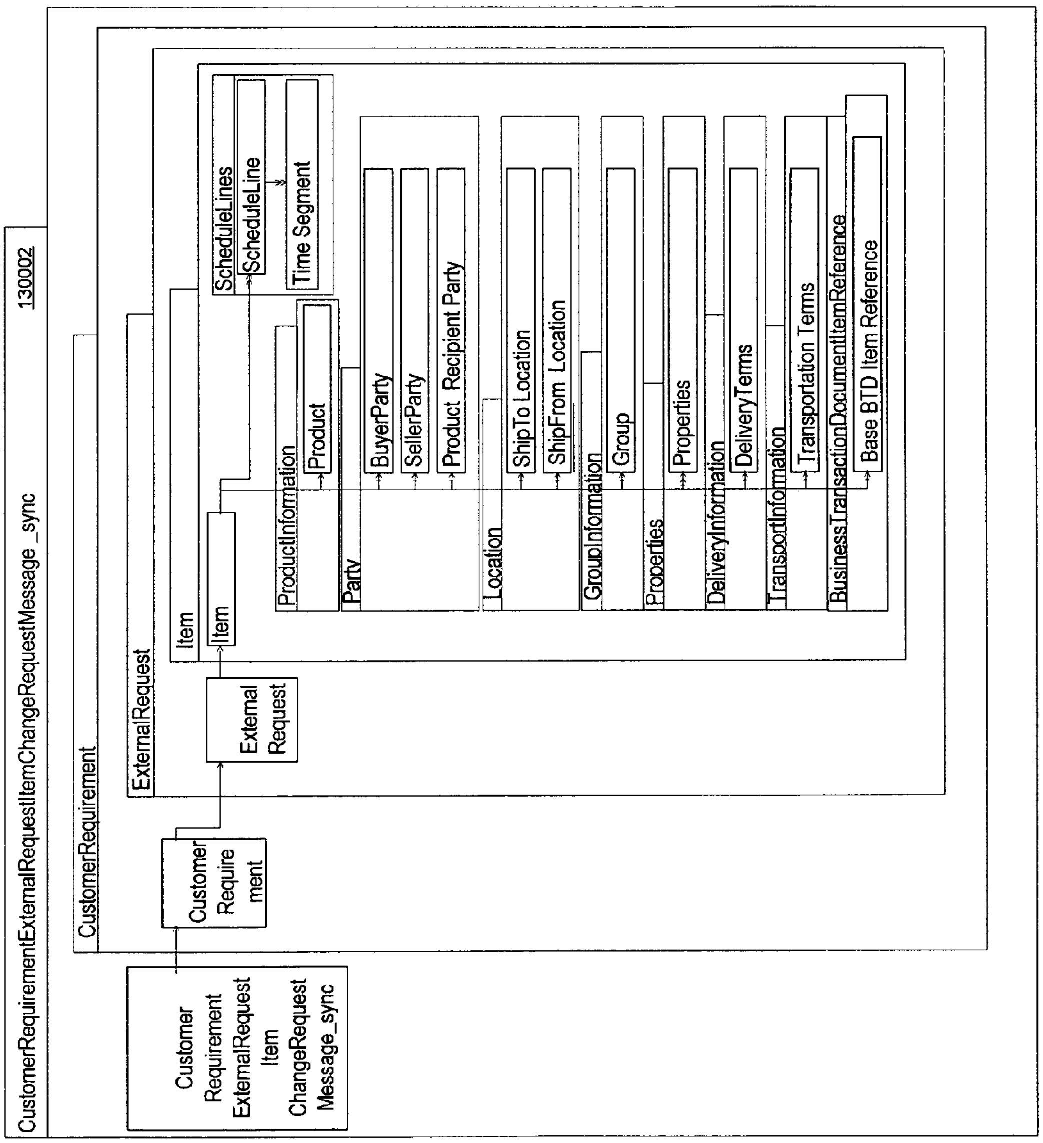
Figure 131:
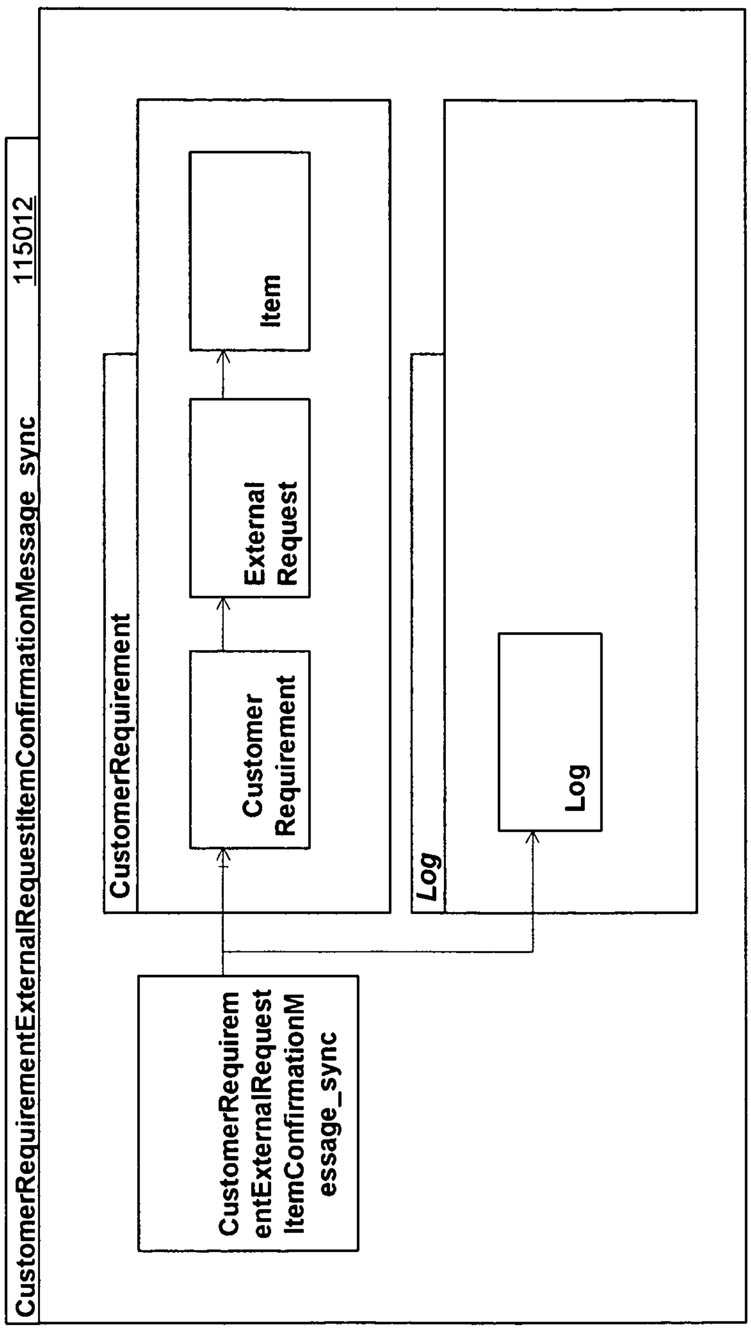
Figure 132:
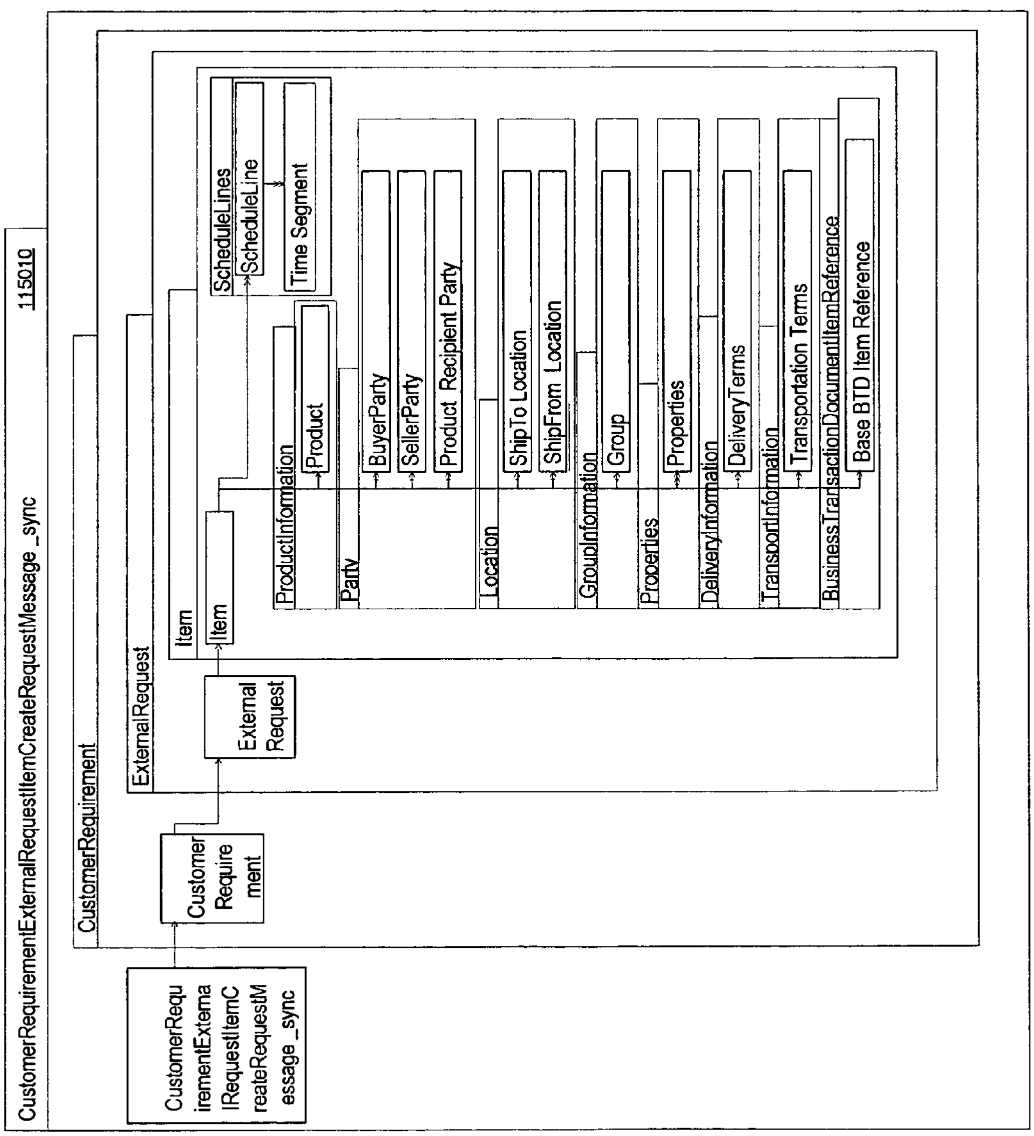
Figure 149:
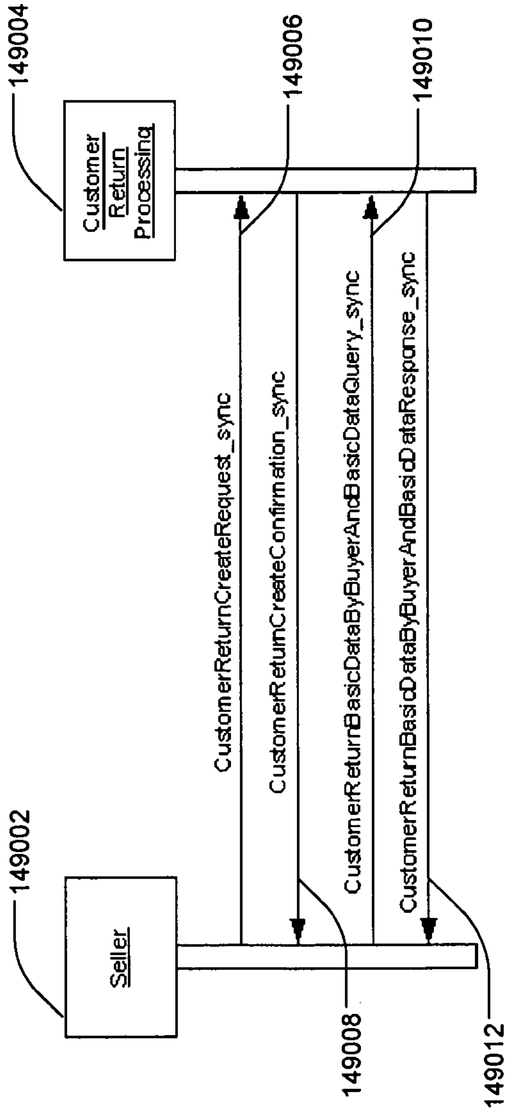
Figure 150:
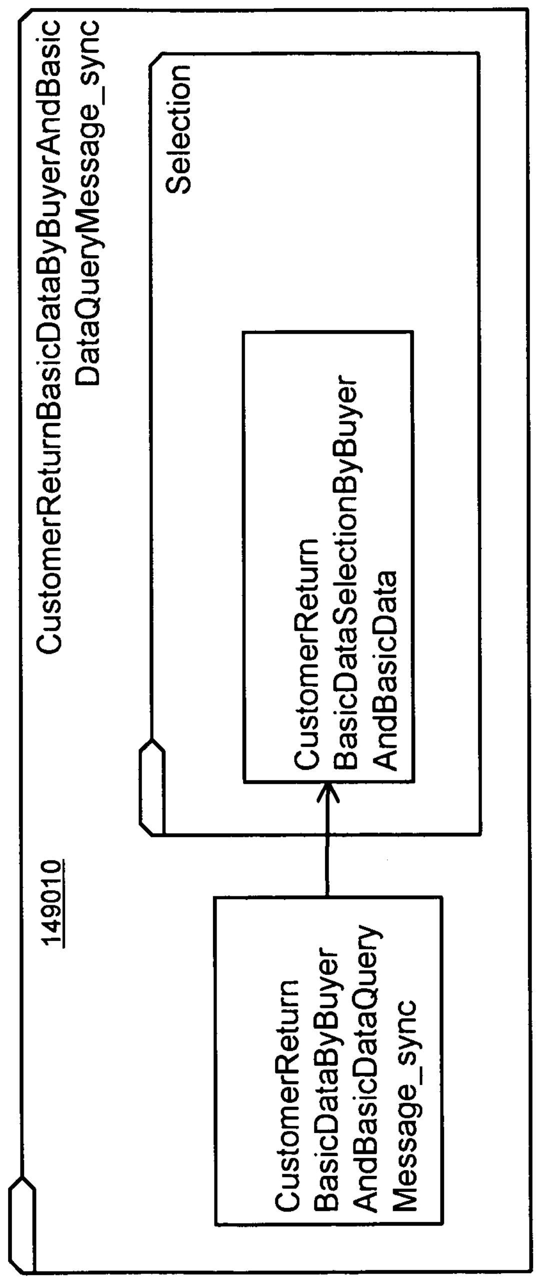
Figure 156:
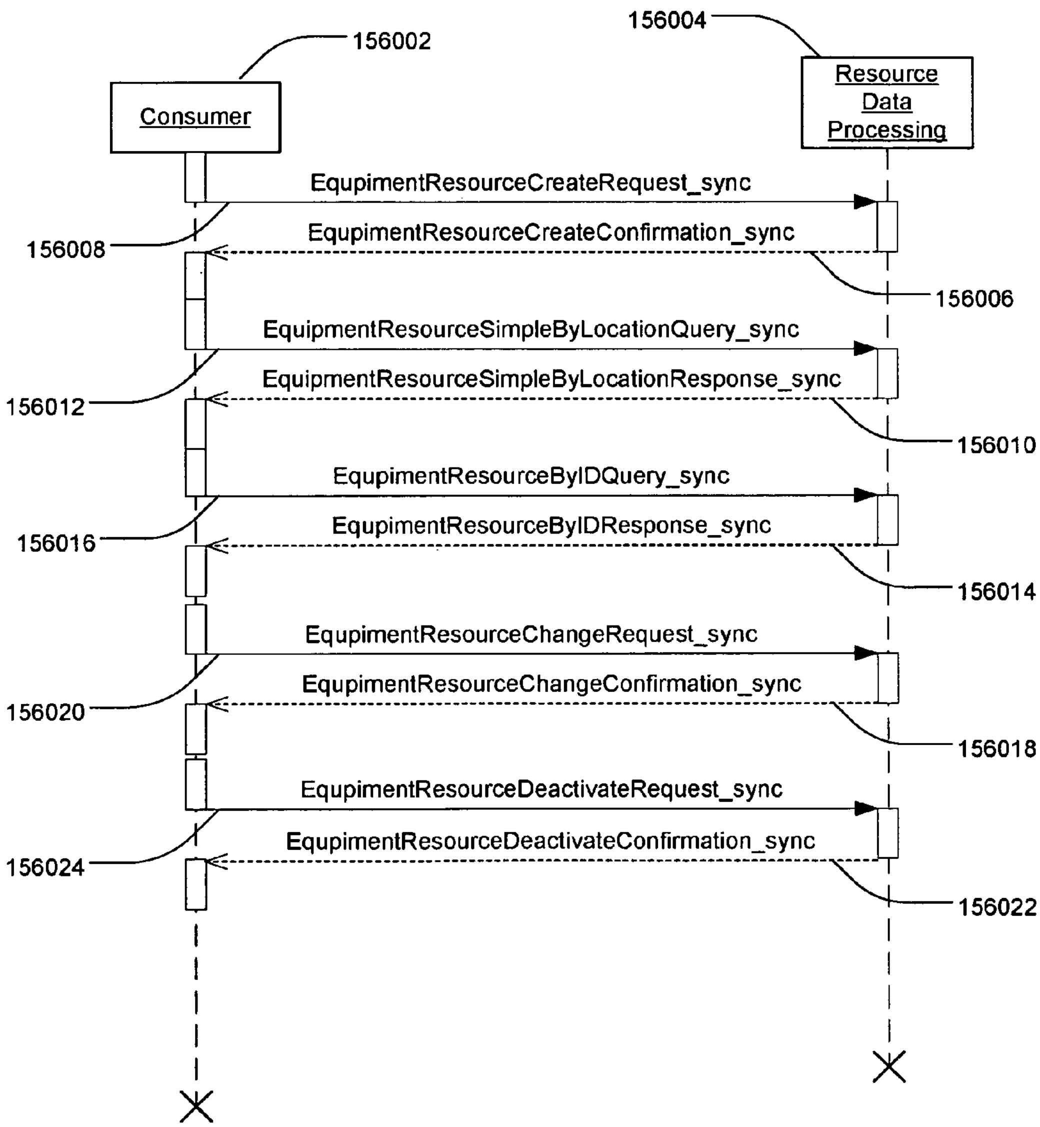
Figure 157:
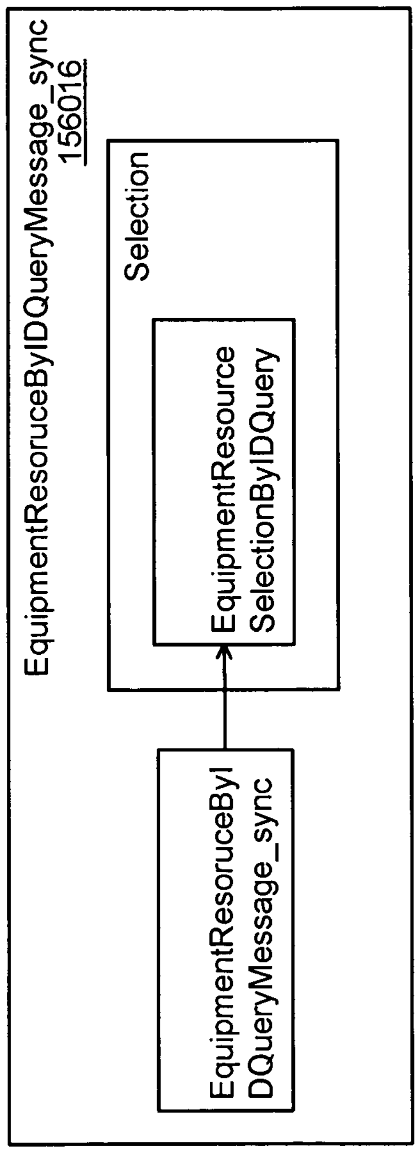
Figure 158:
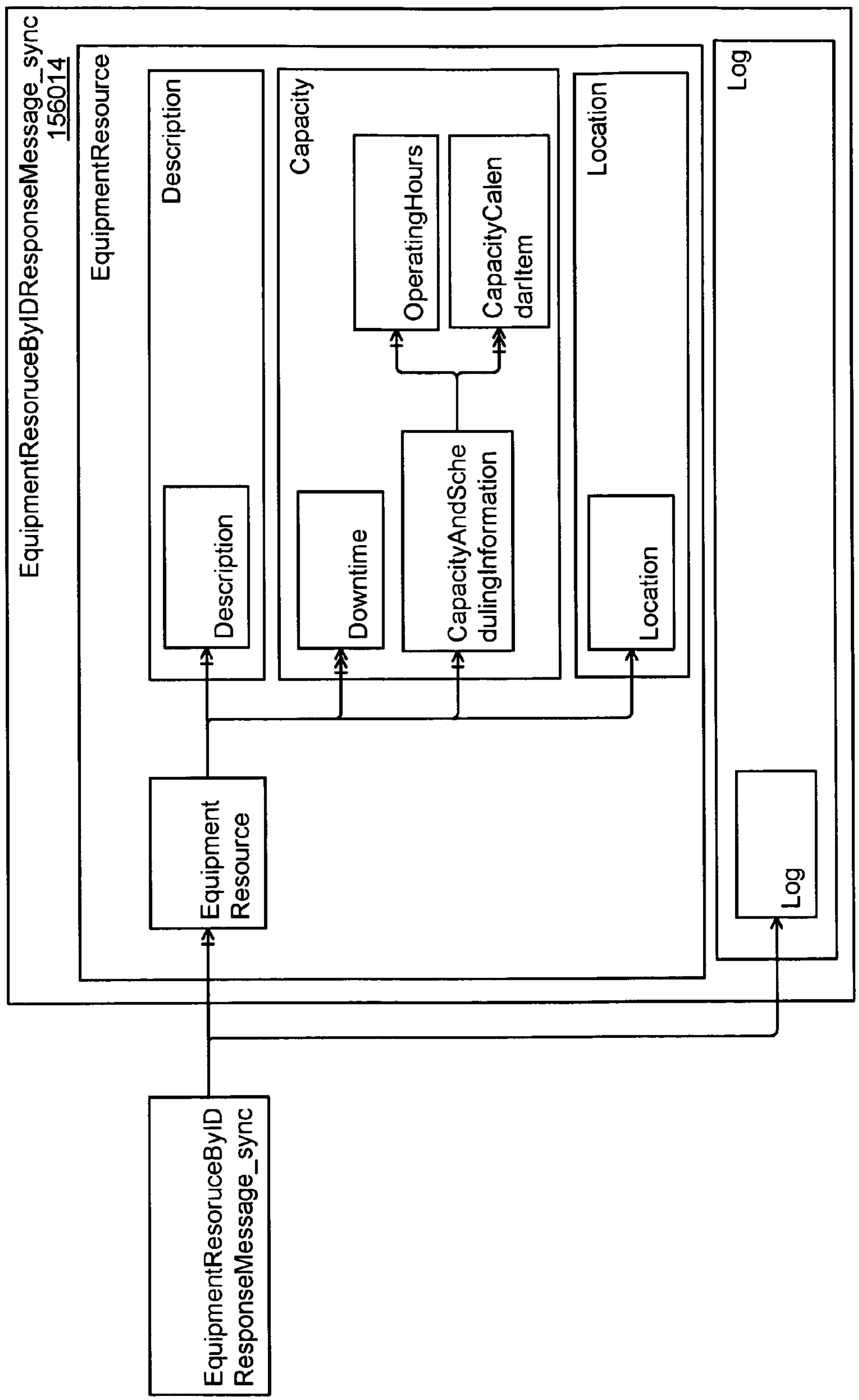
Figure 159:
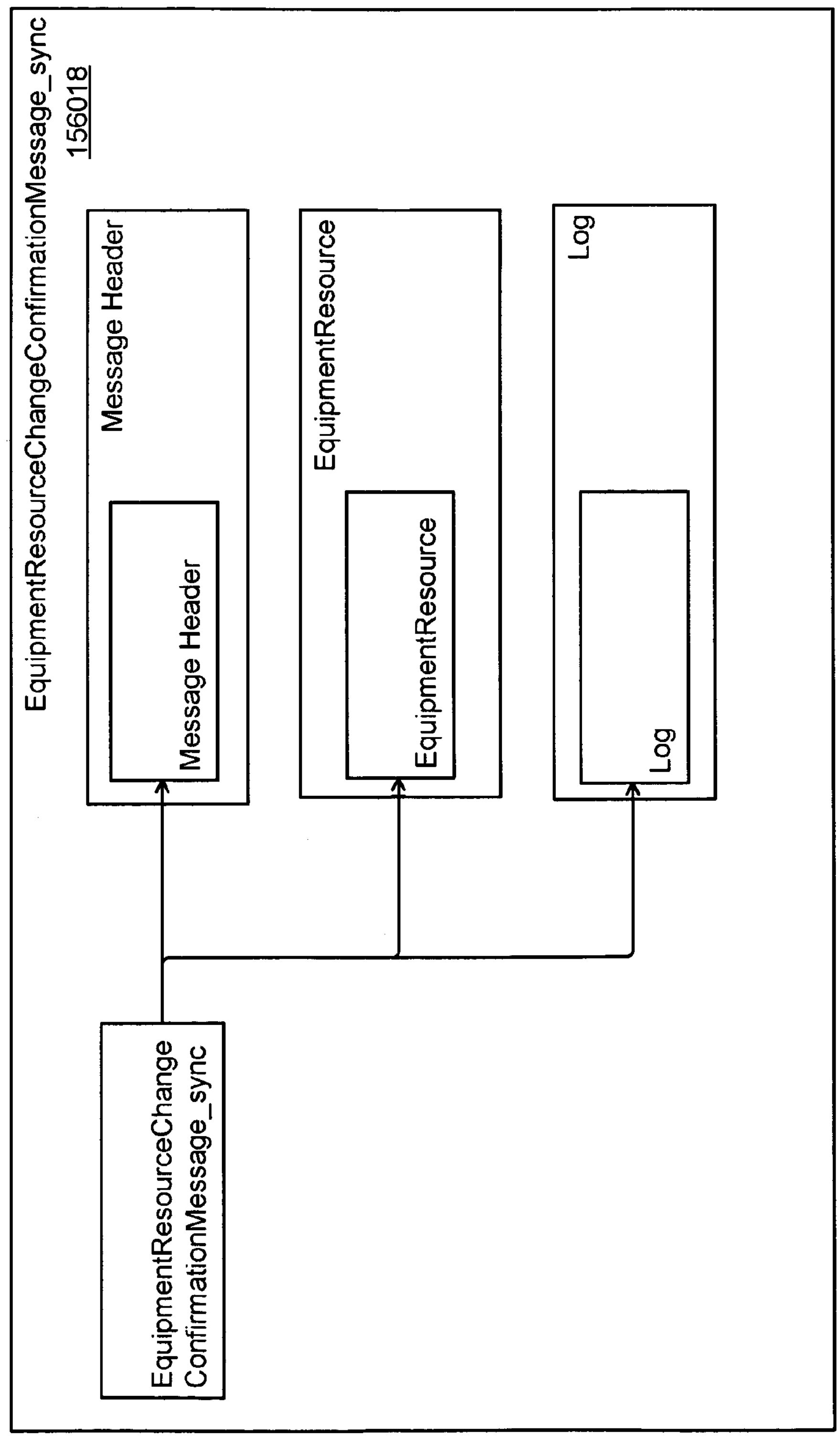
Figure 160:
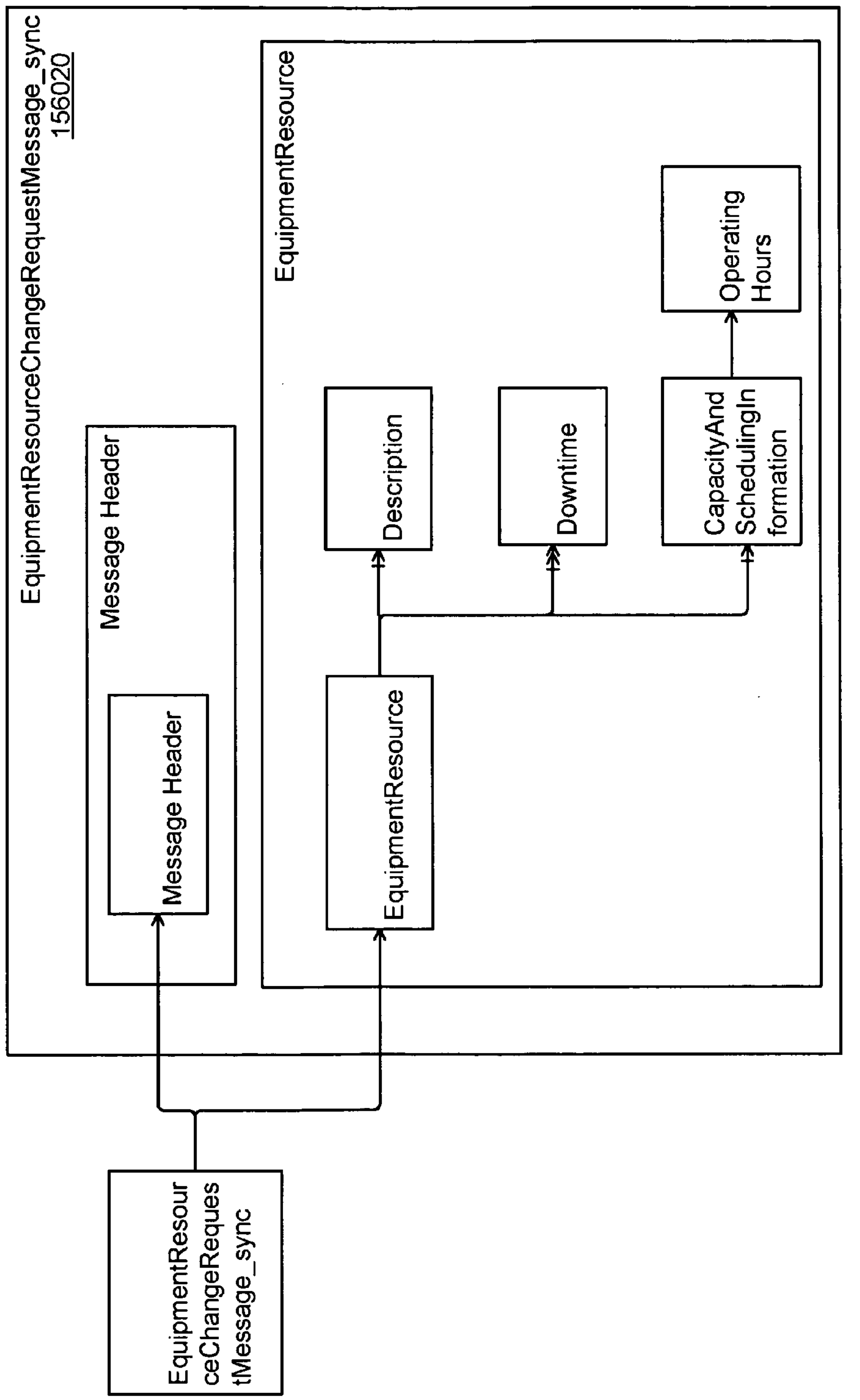
Figure 161:
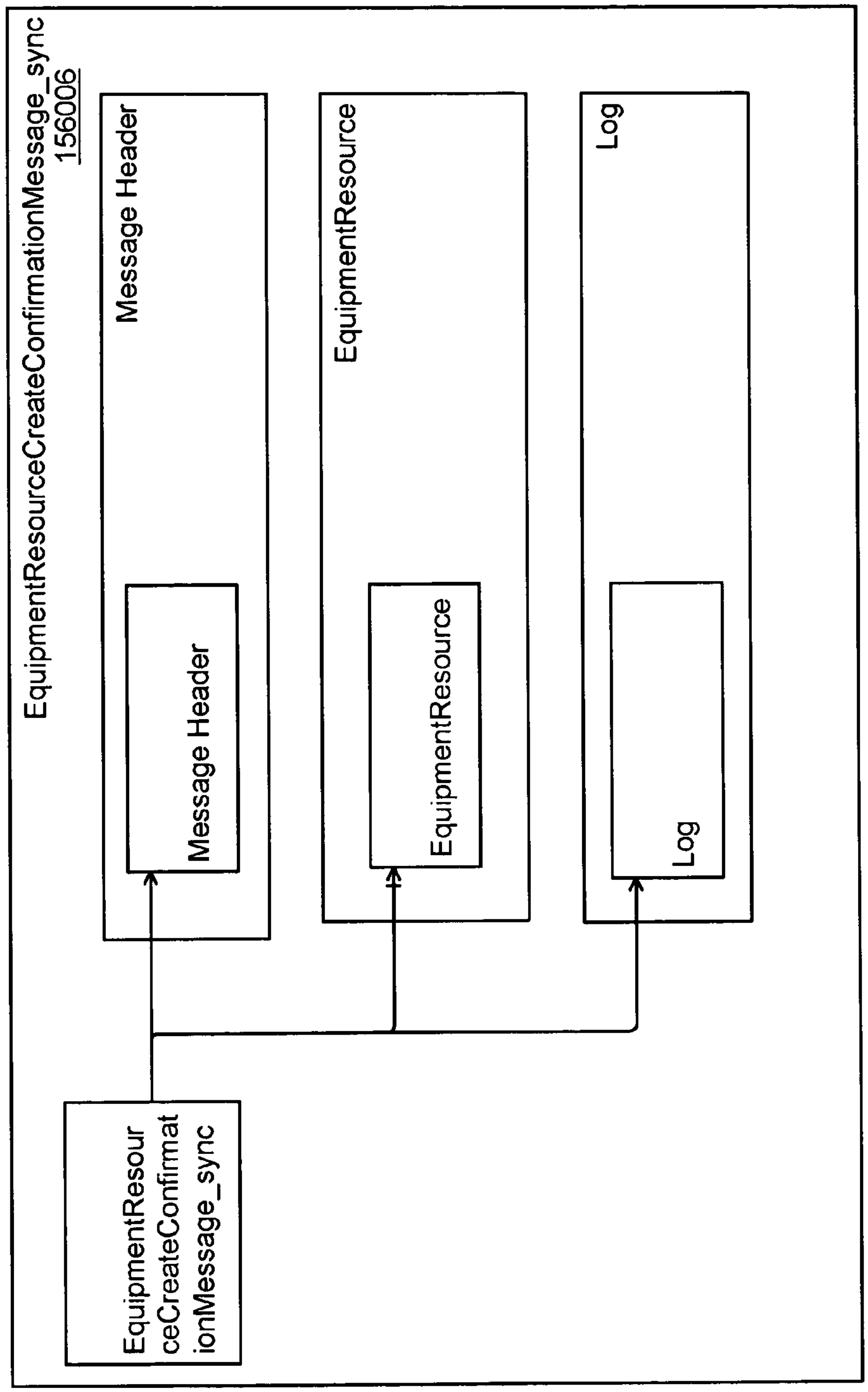
Figure 162:
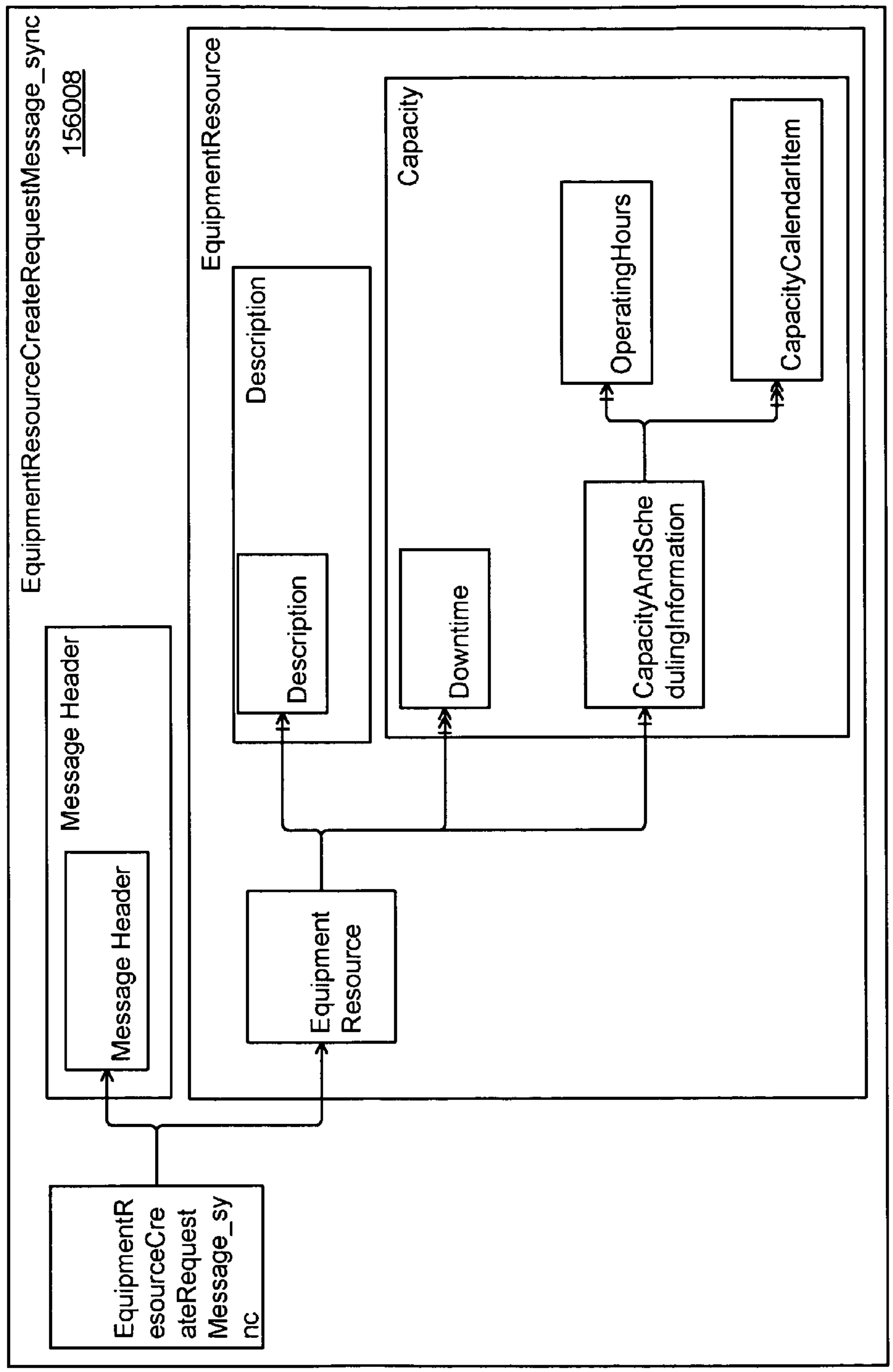
Figure 163:
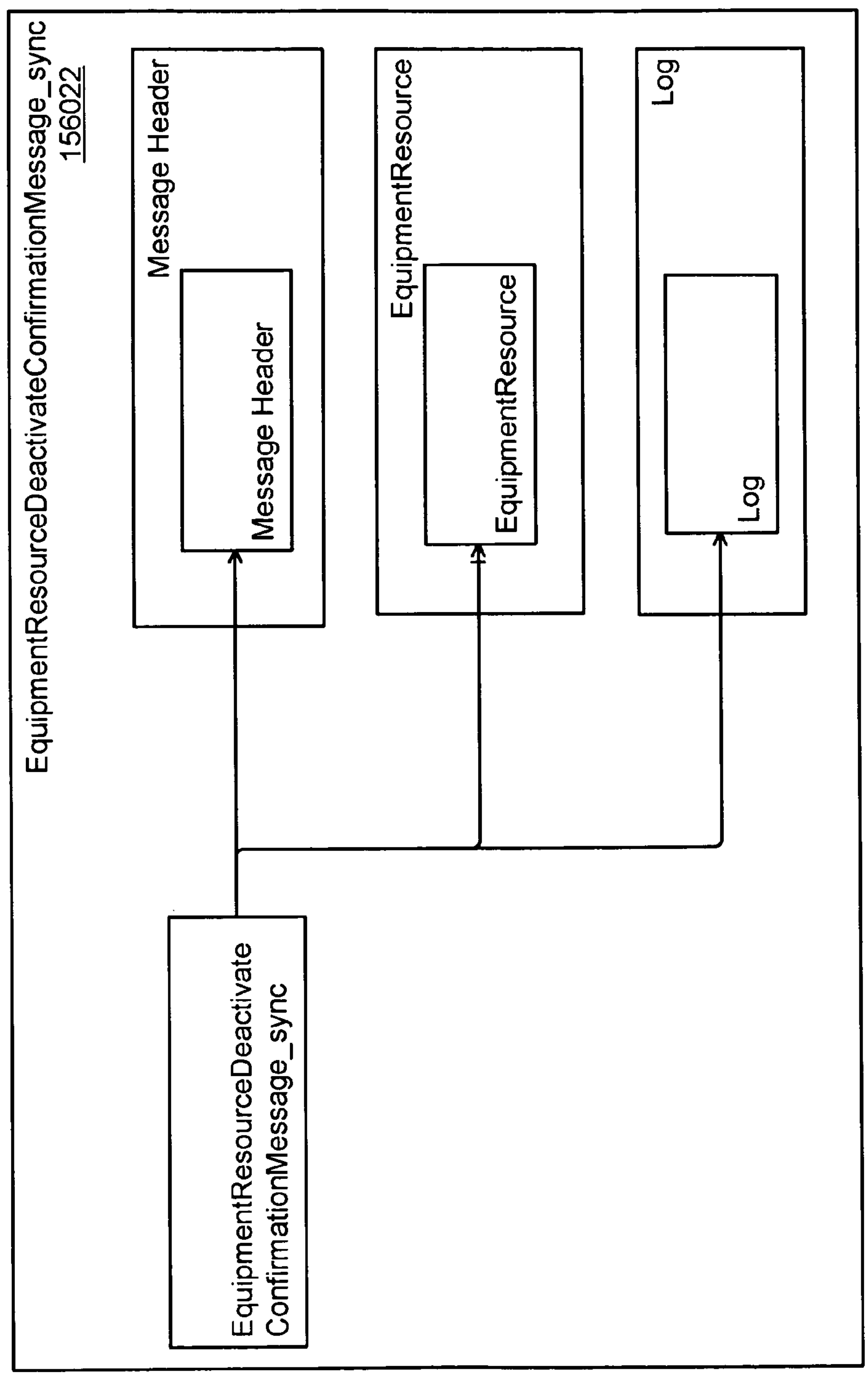
Figure 164:
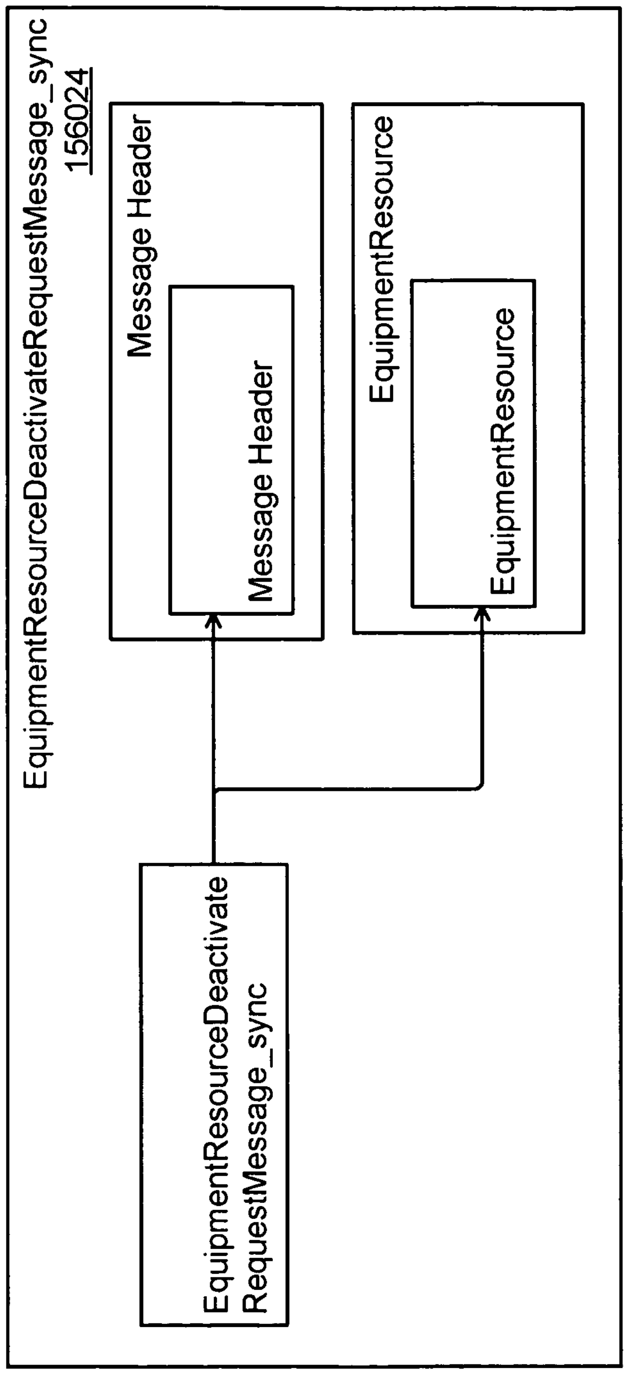
Figure 165:
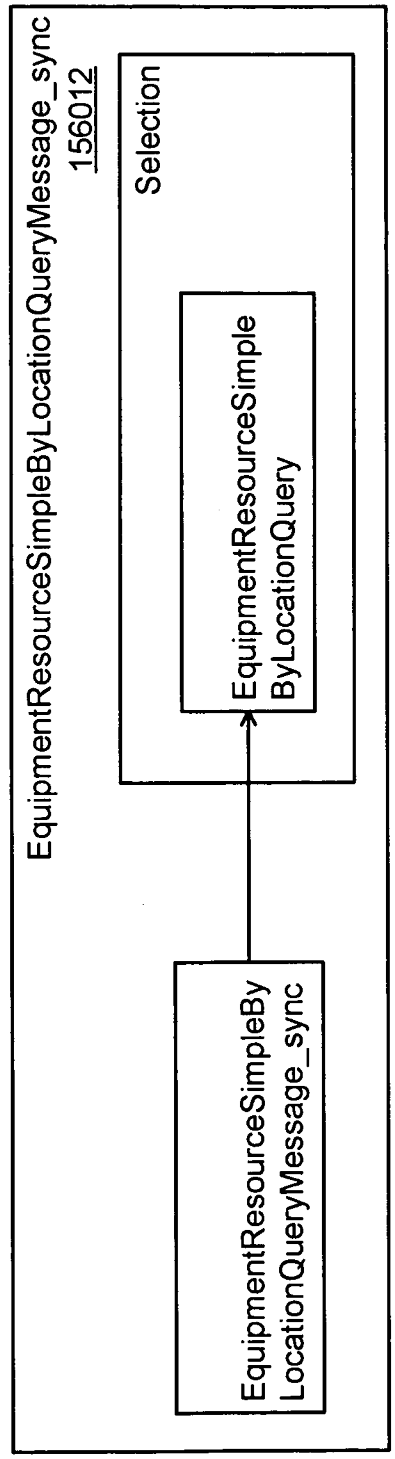
Figure 166:
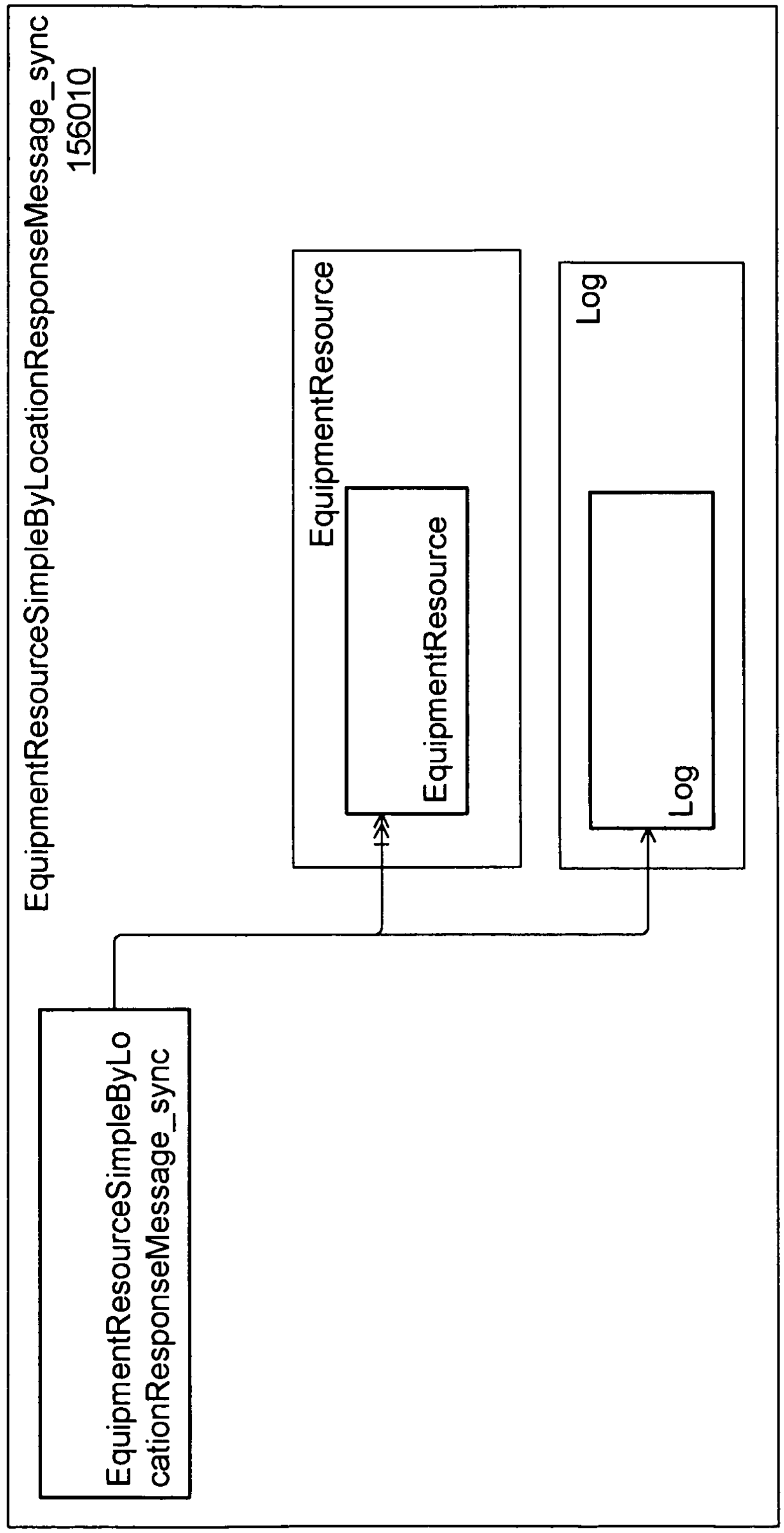
Figure 177:
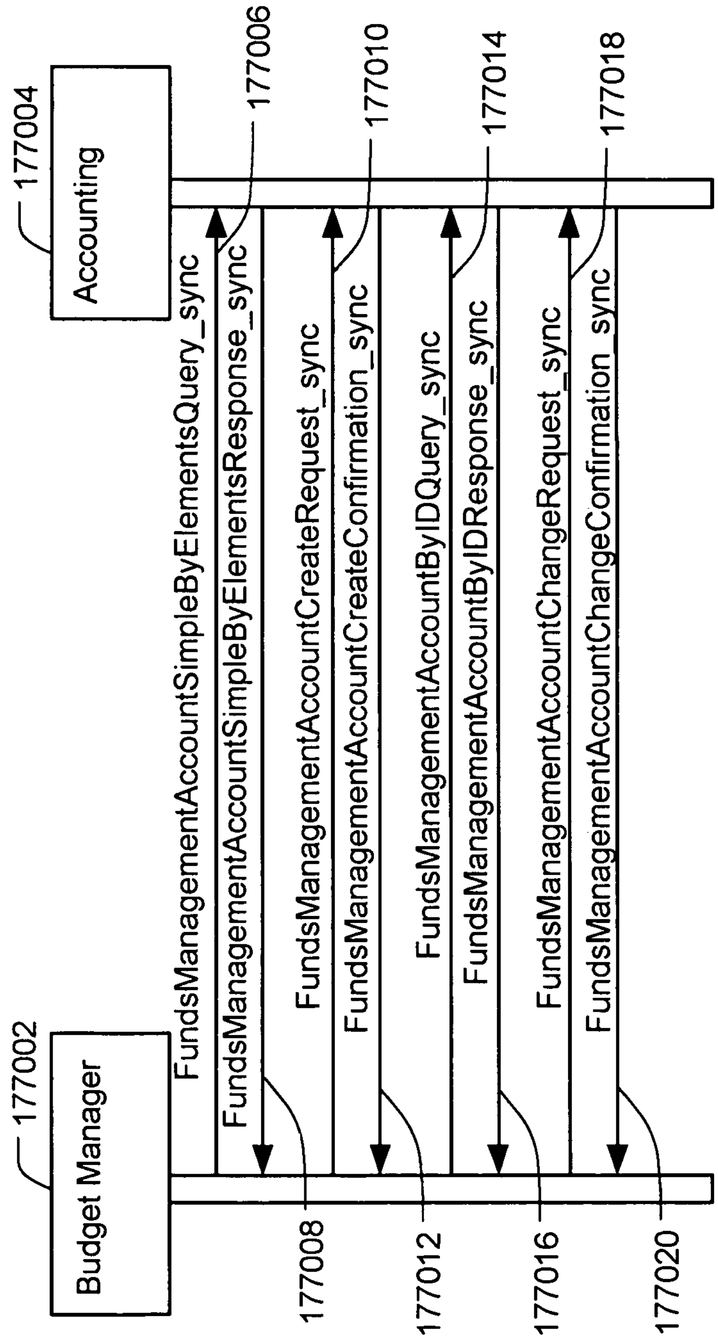
Figure 178:
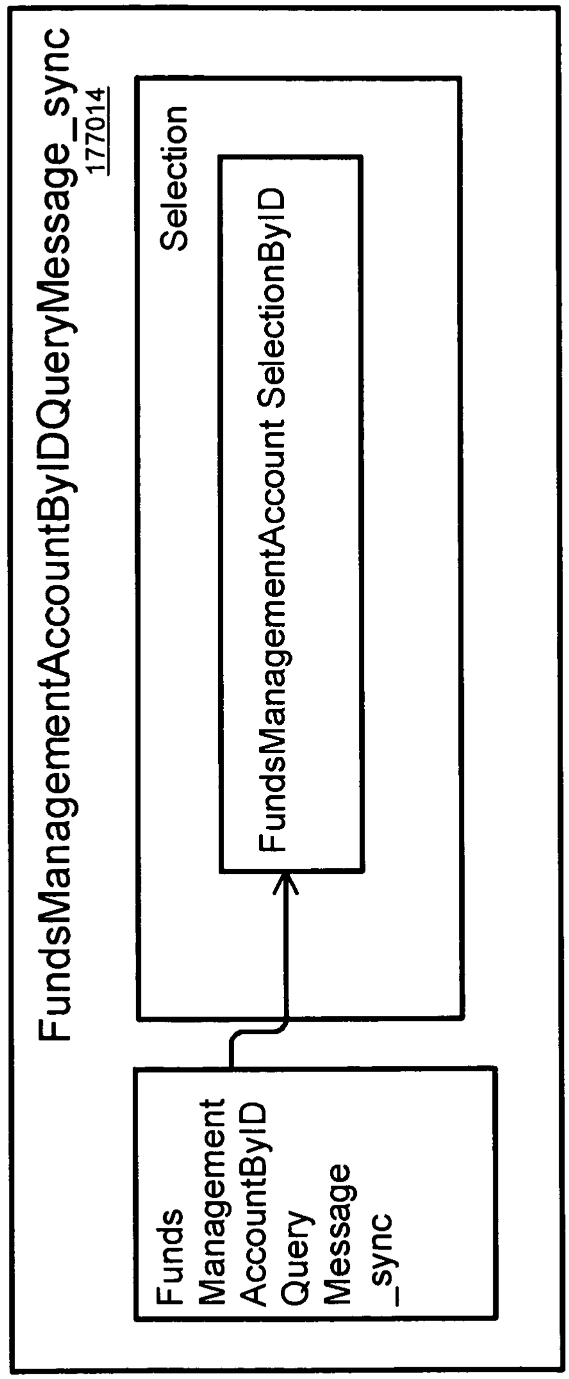
Figure 179:
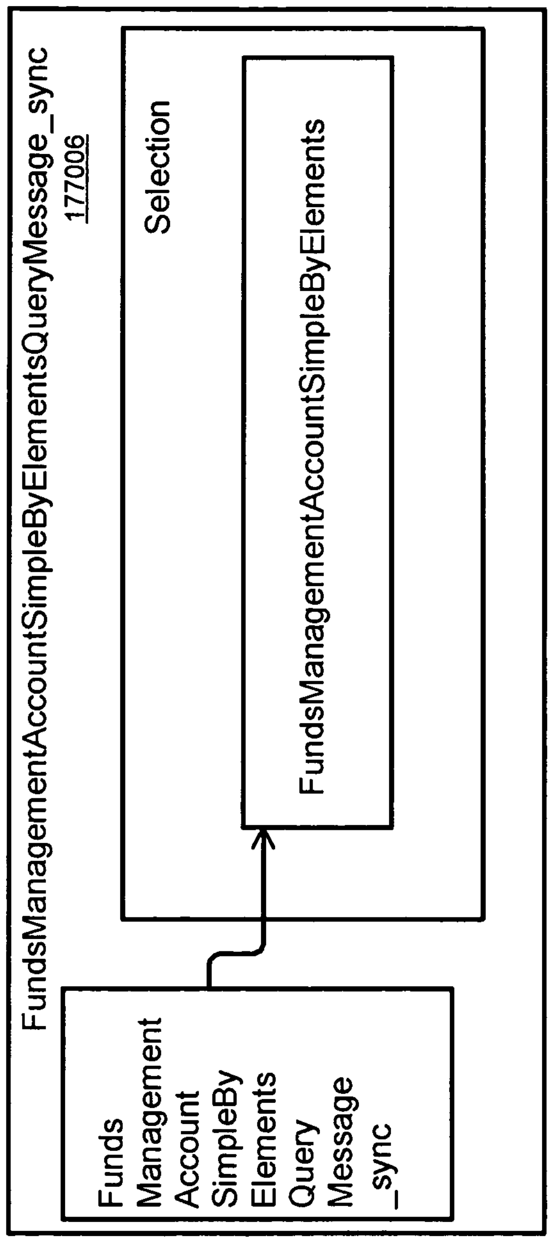
Figure 189:
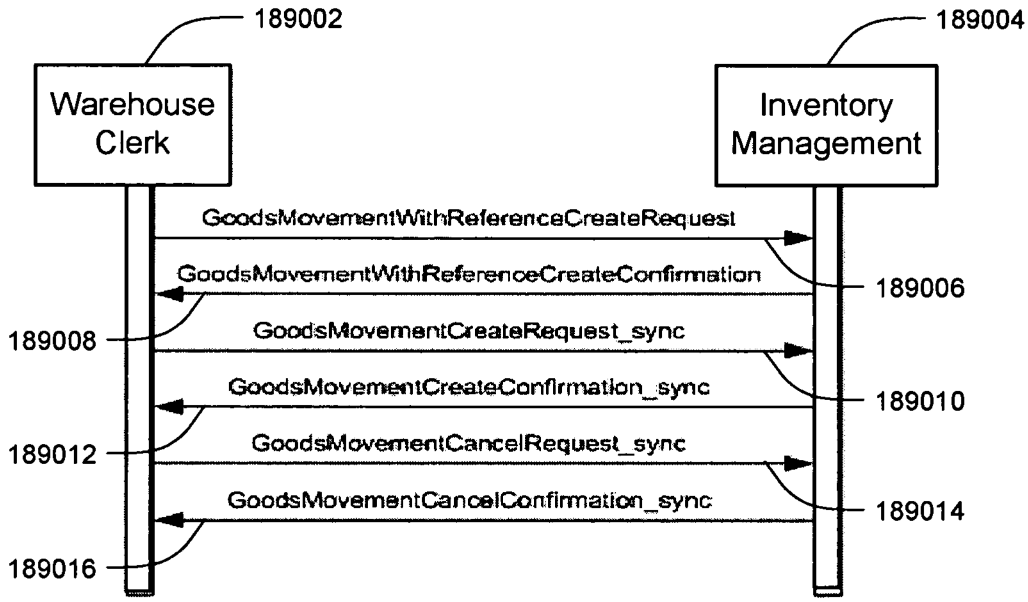
Figure 190:
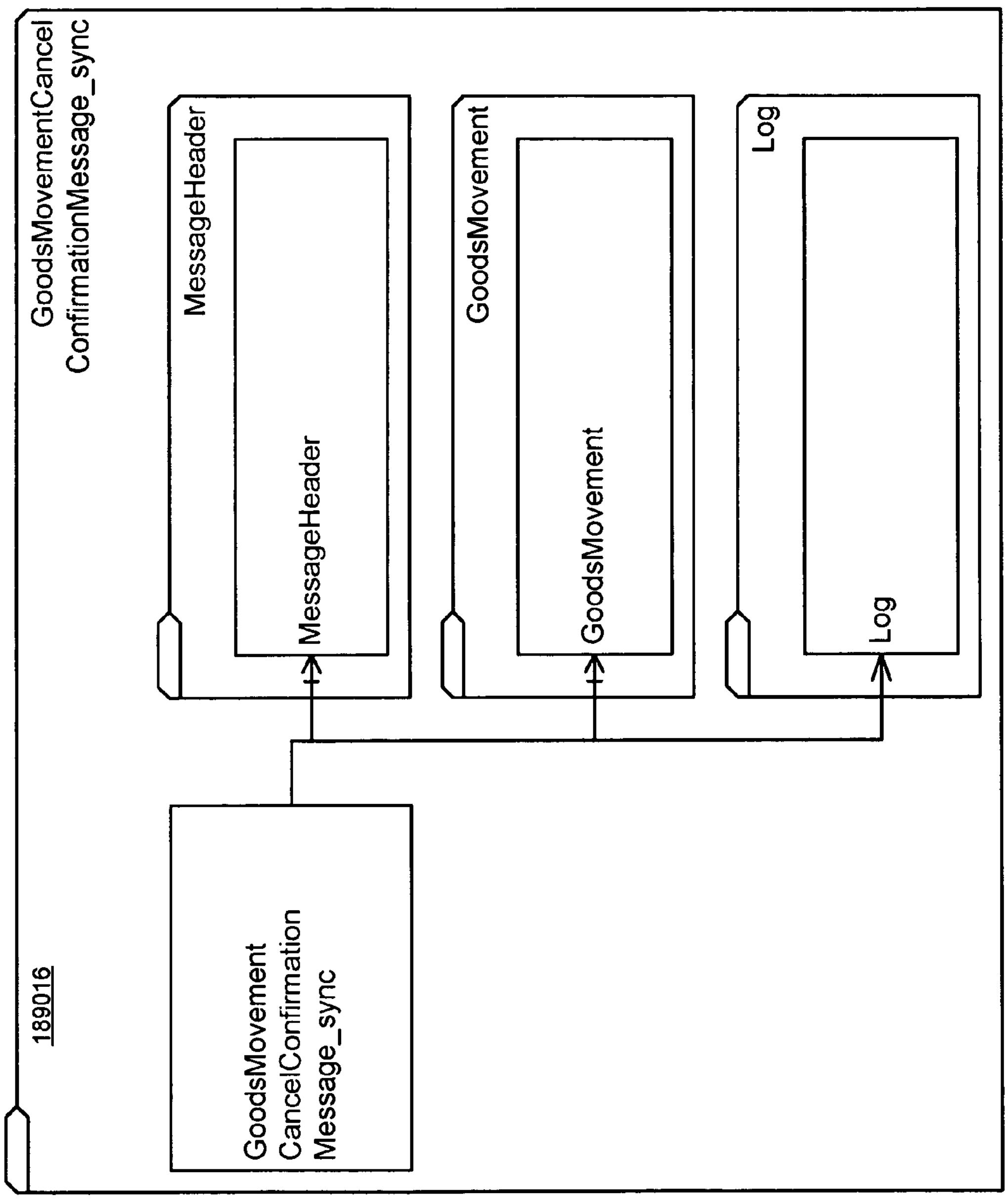
Figure 191:
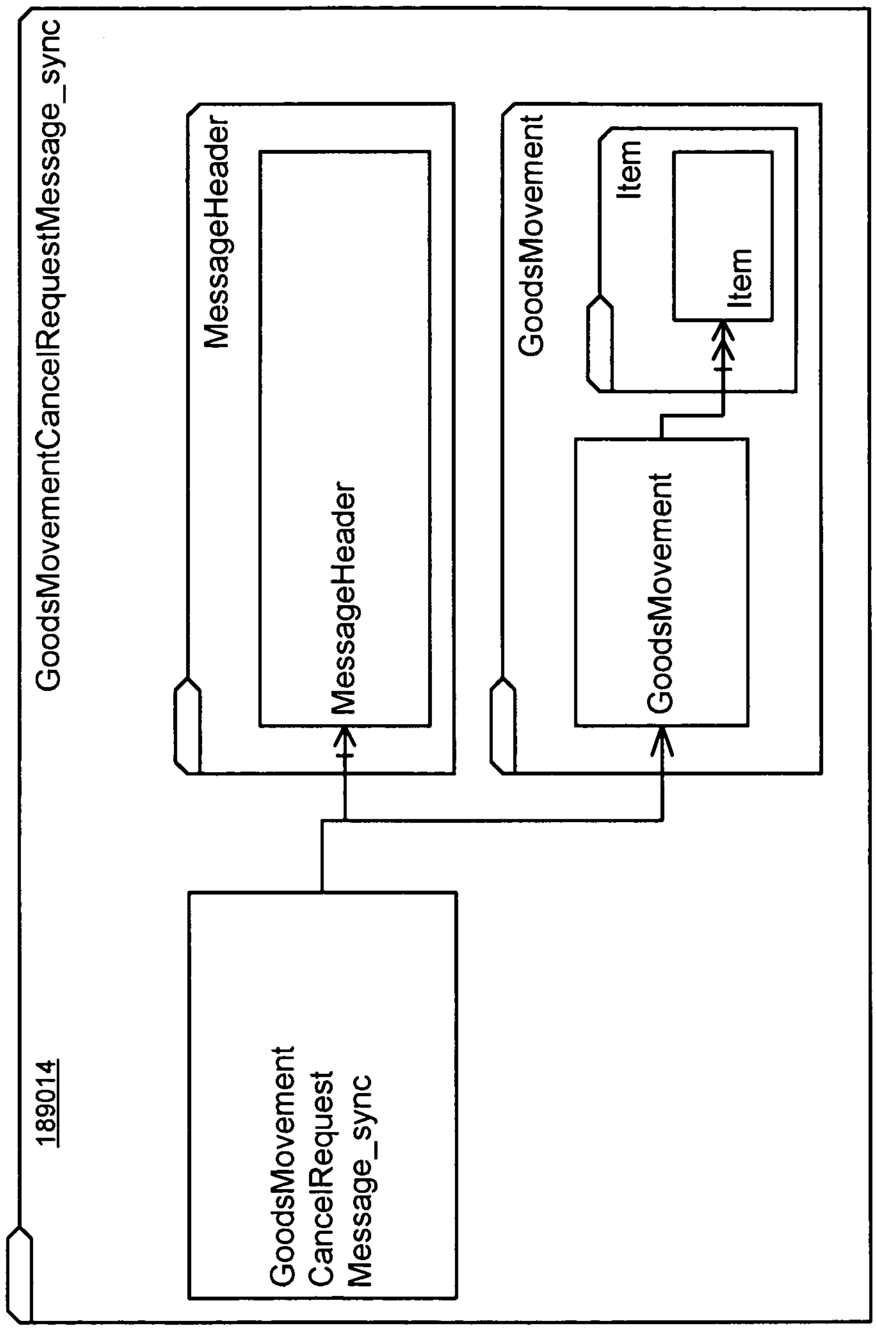
Figure 192:
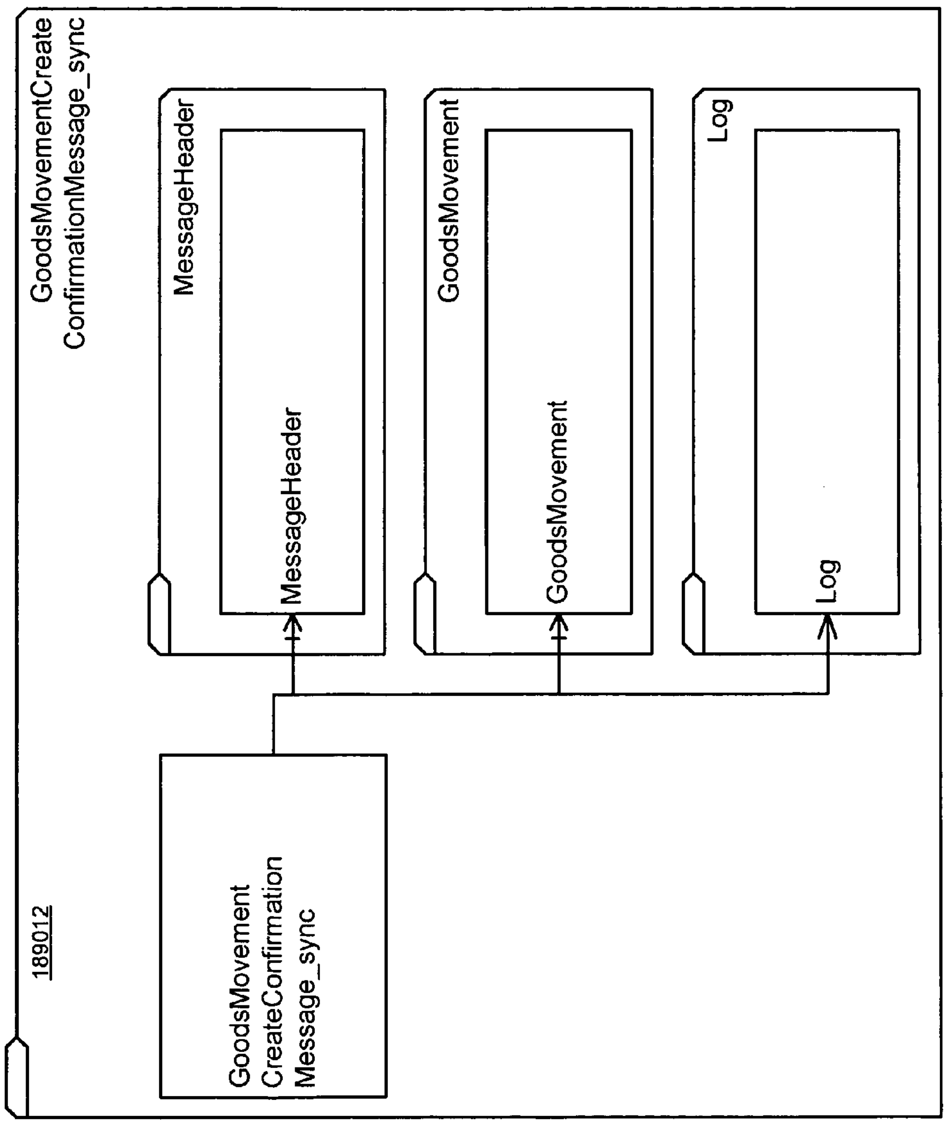
Figure 193:
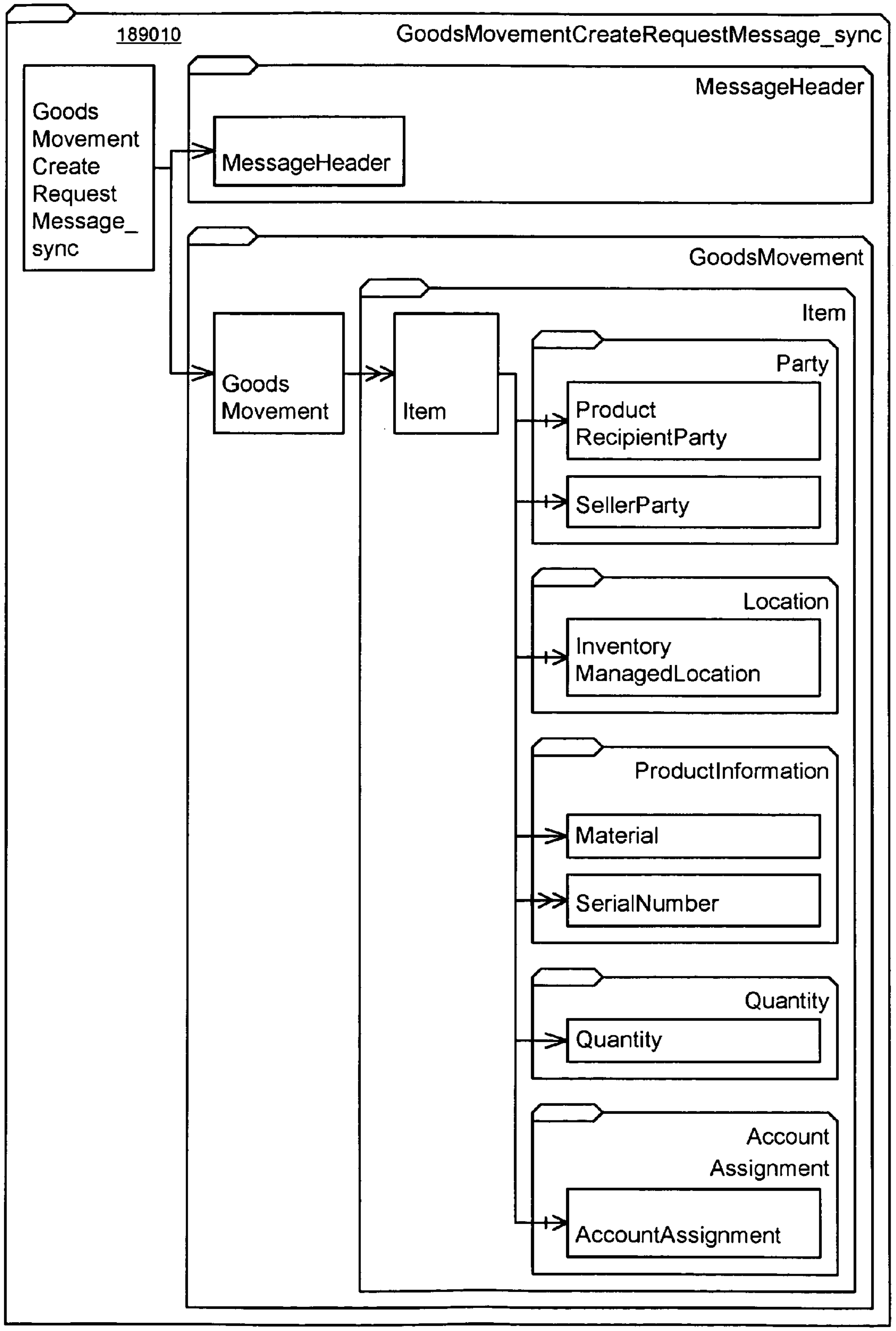
Figure 194:
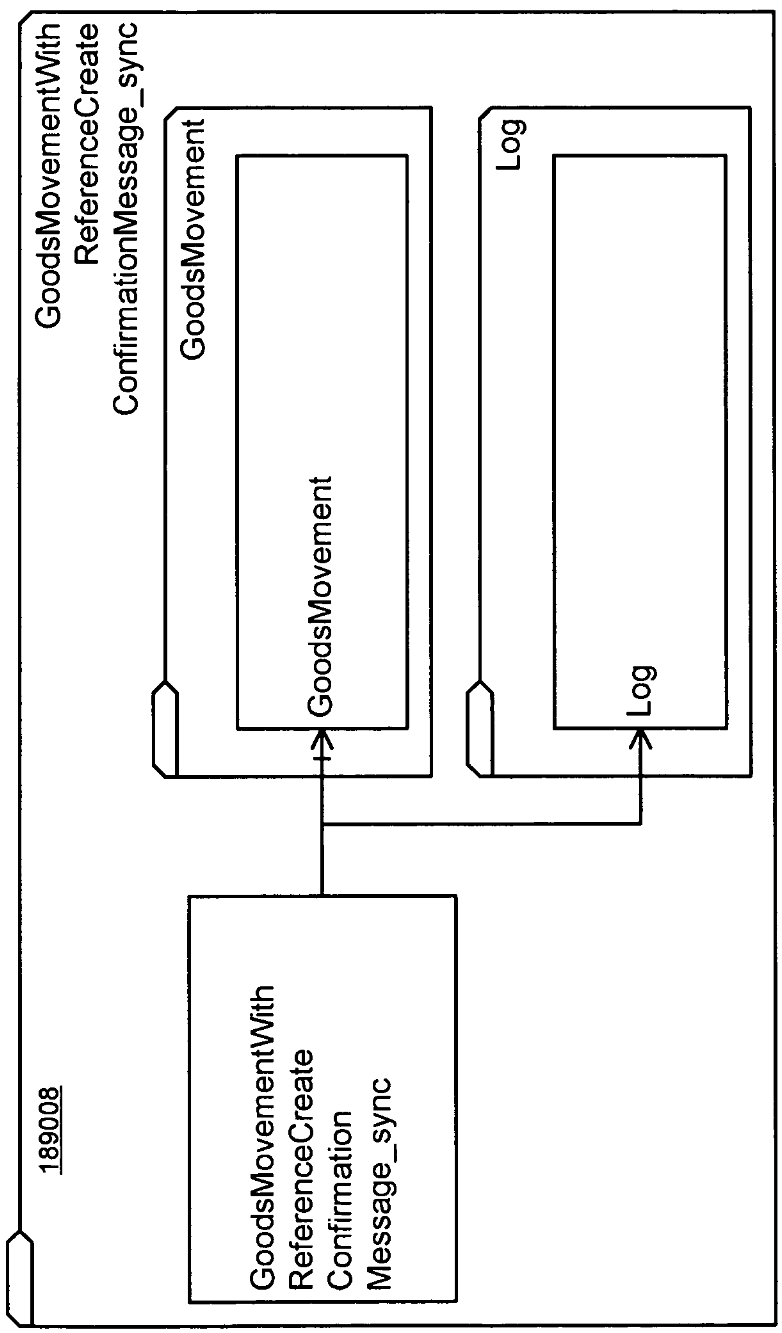
Figure 195:
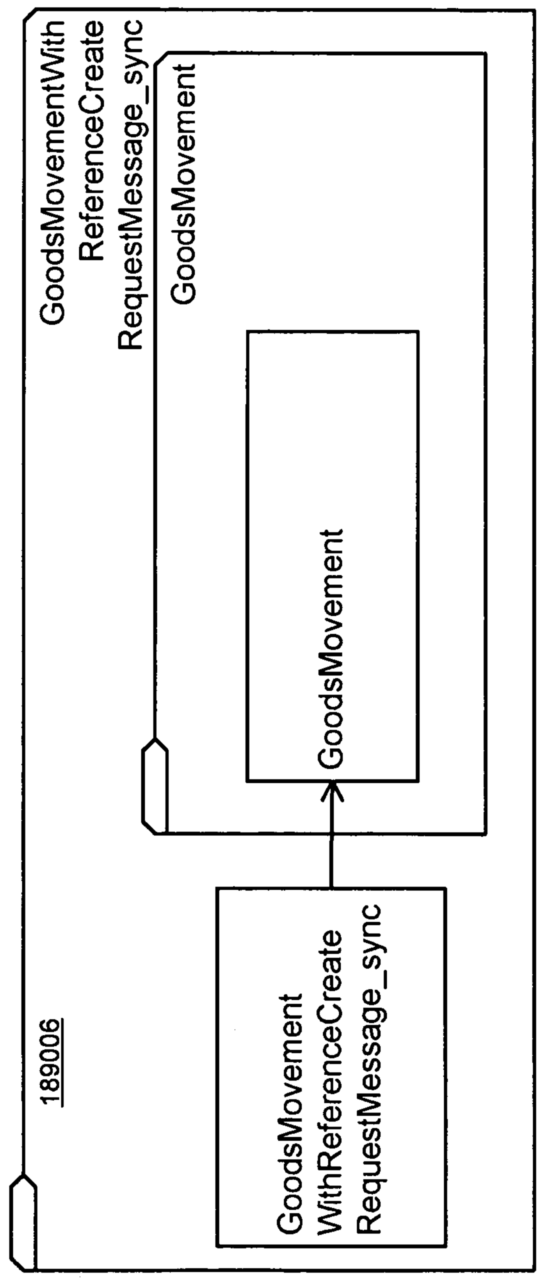
Figure 202:
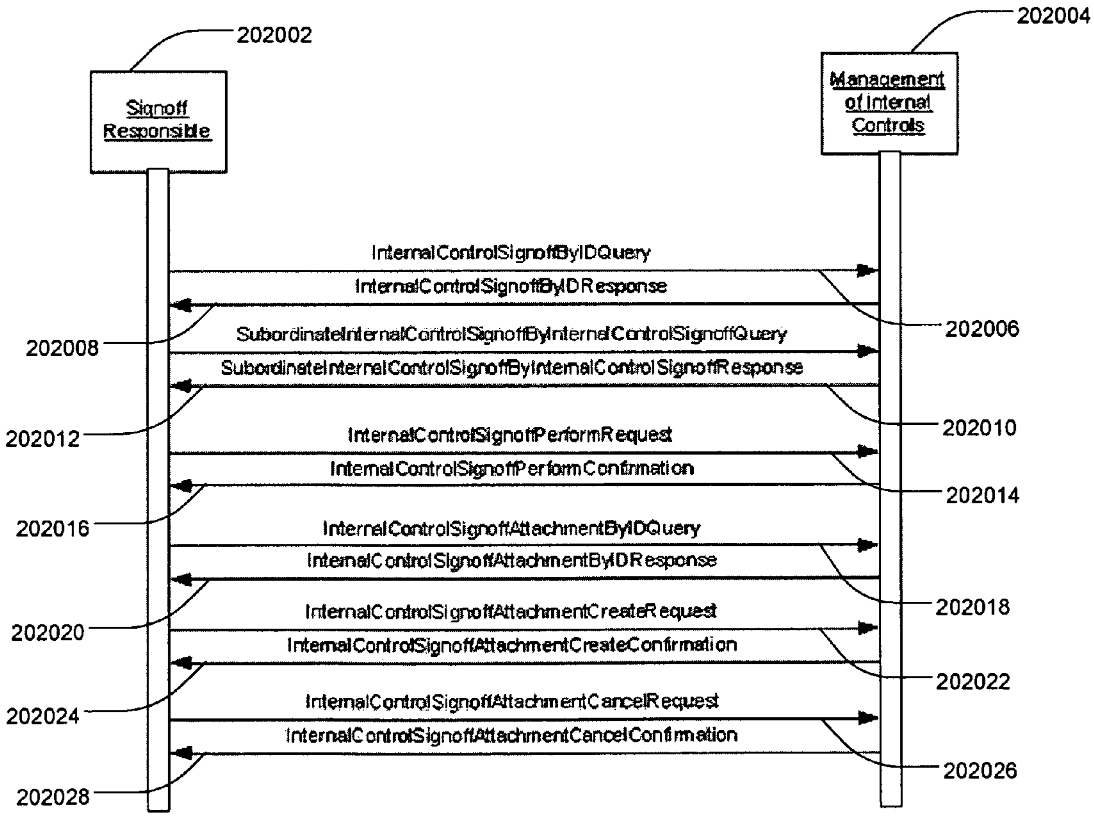
Figure 203:
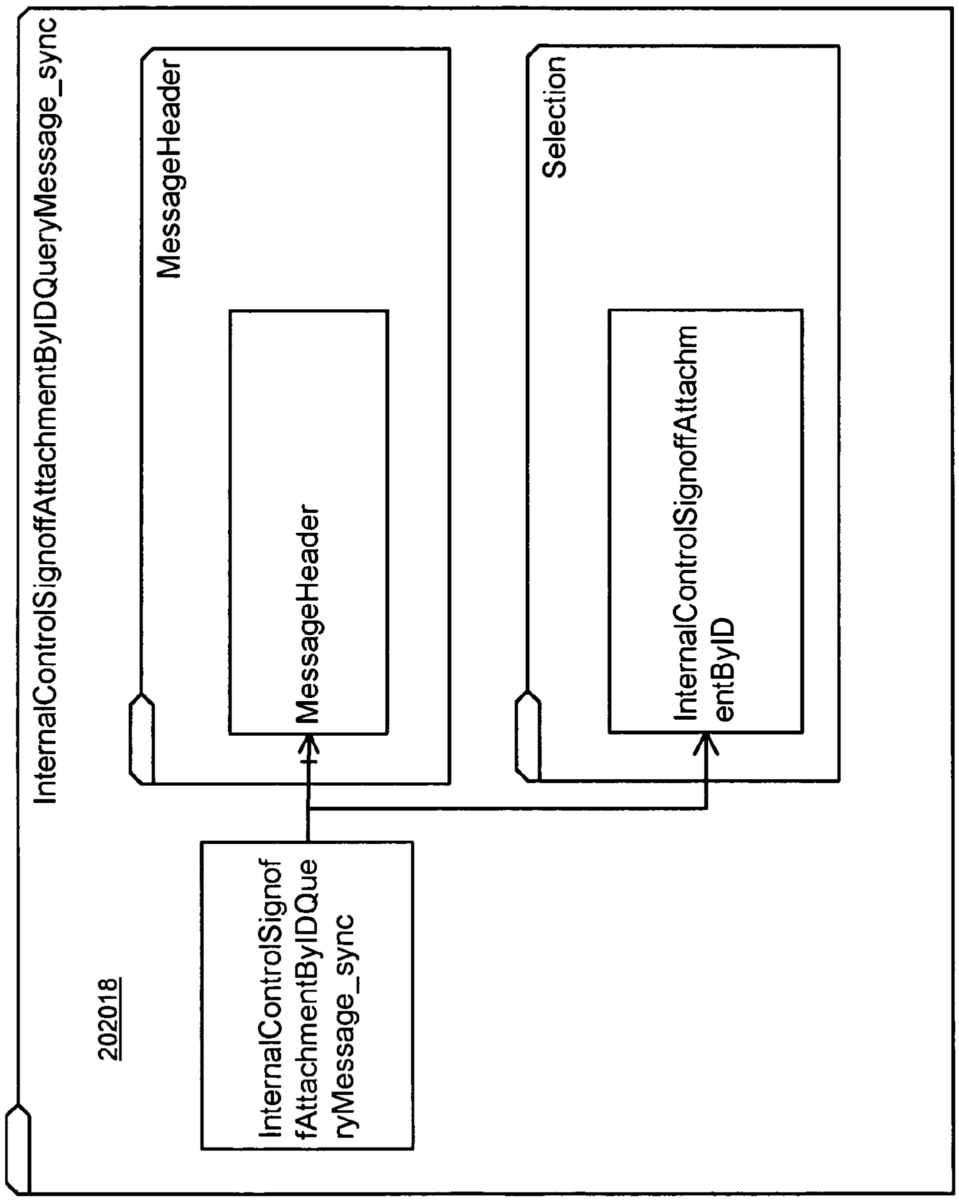
Figure 204:
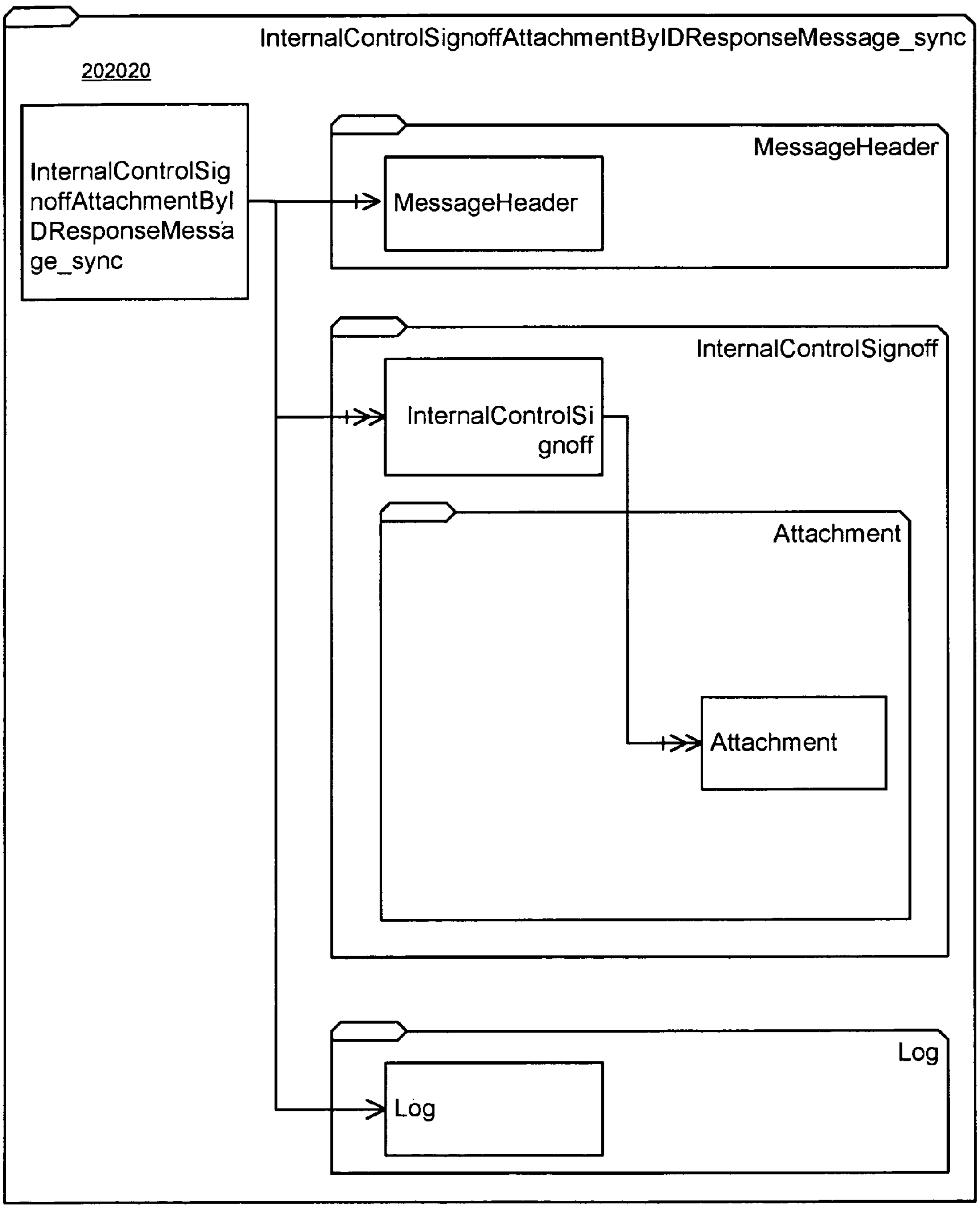
Figure 205:
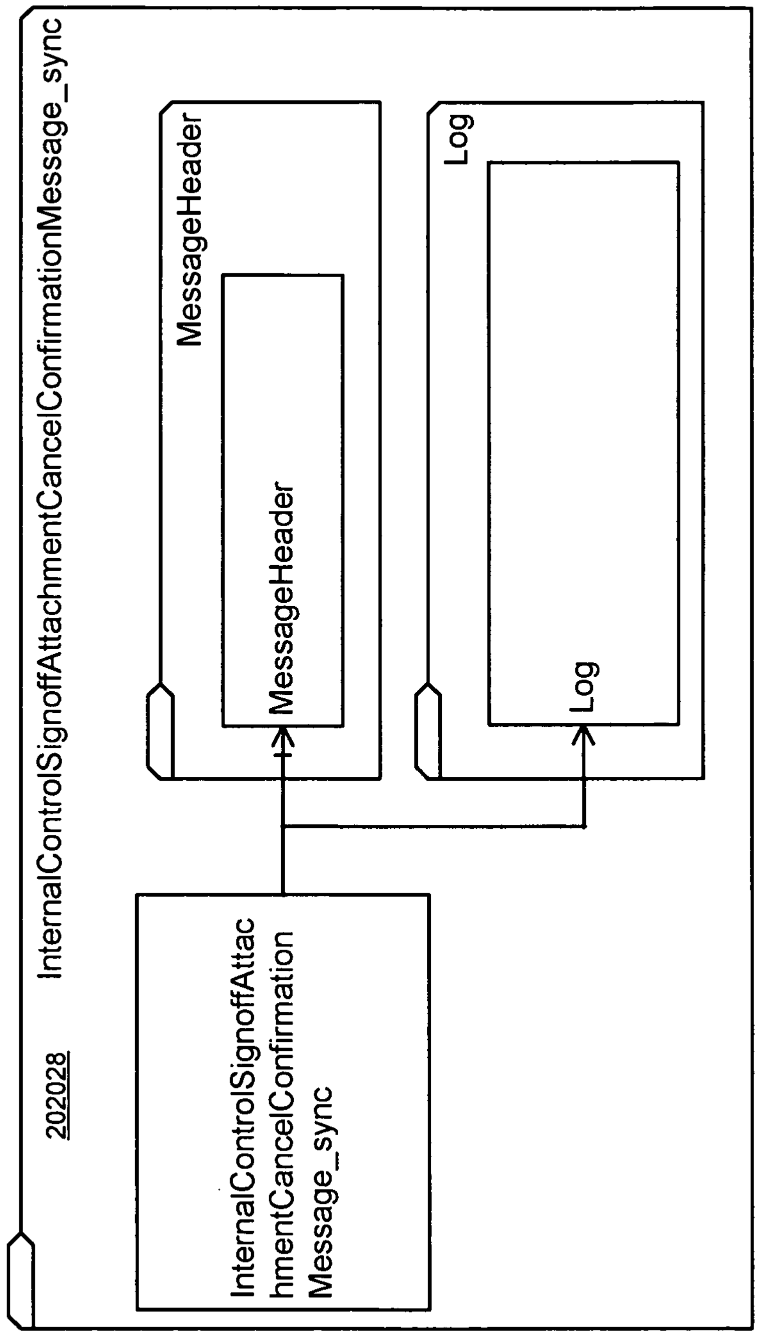
Figure 206:
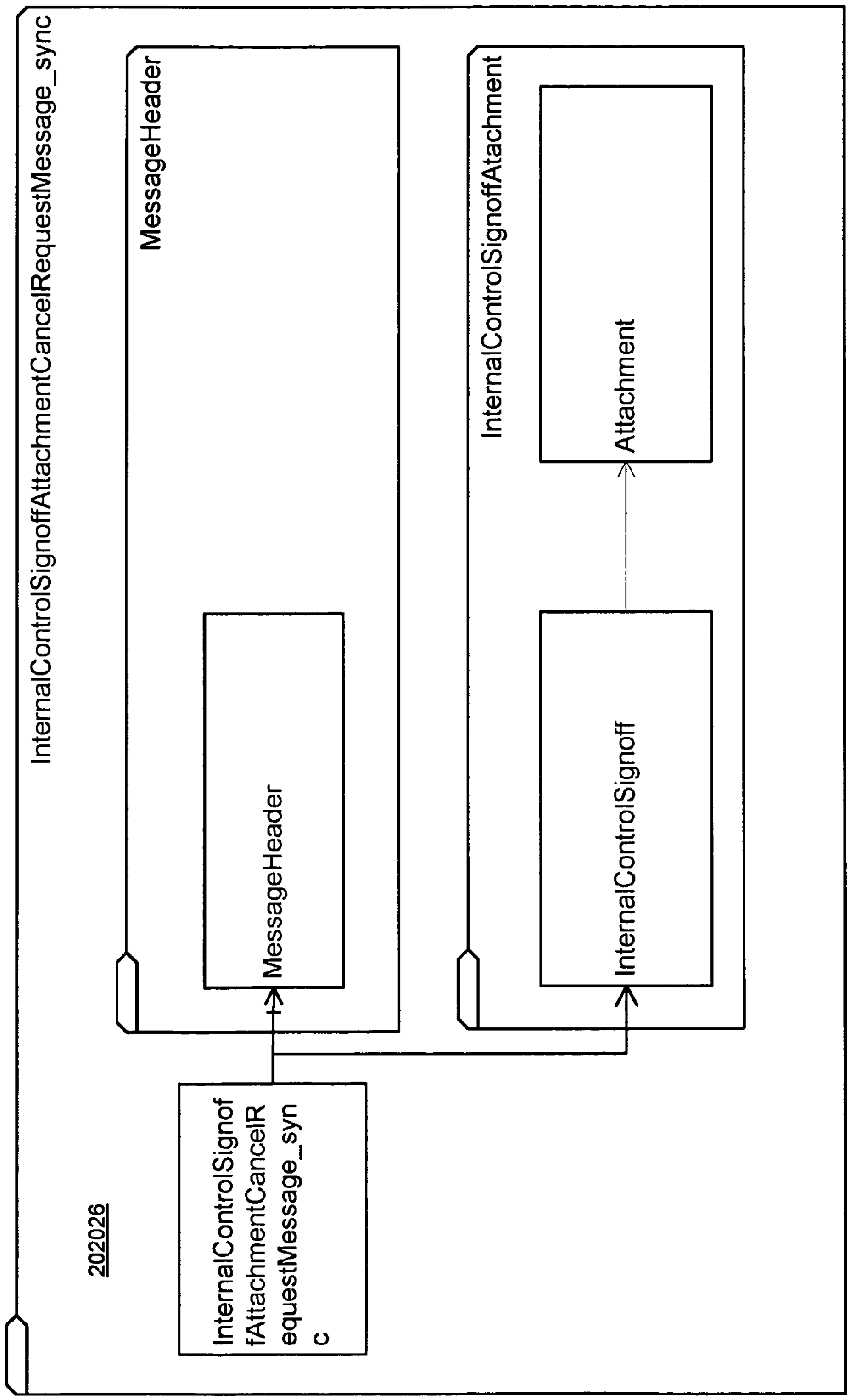
Figure 207:
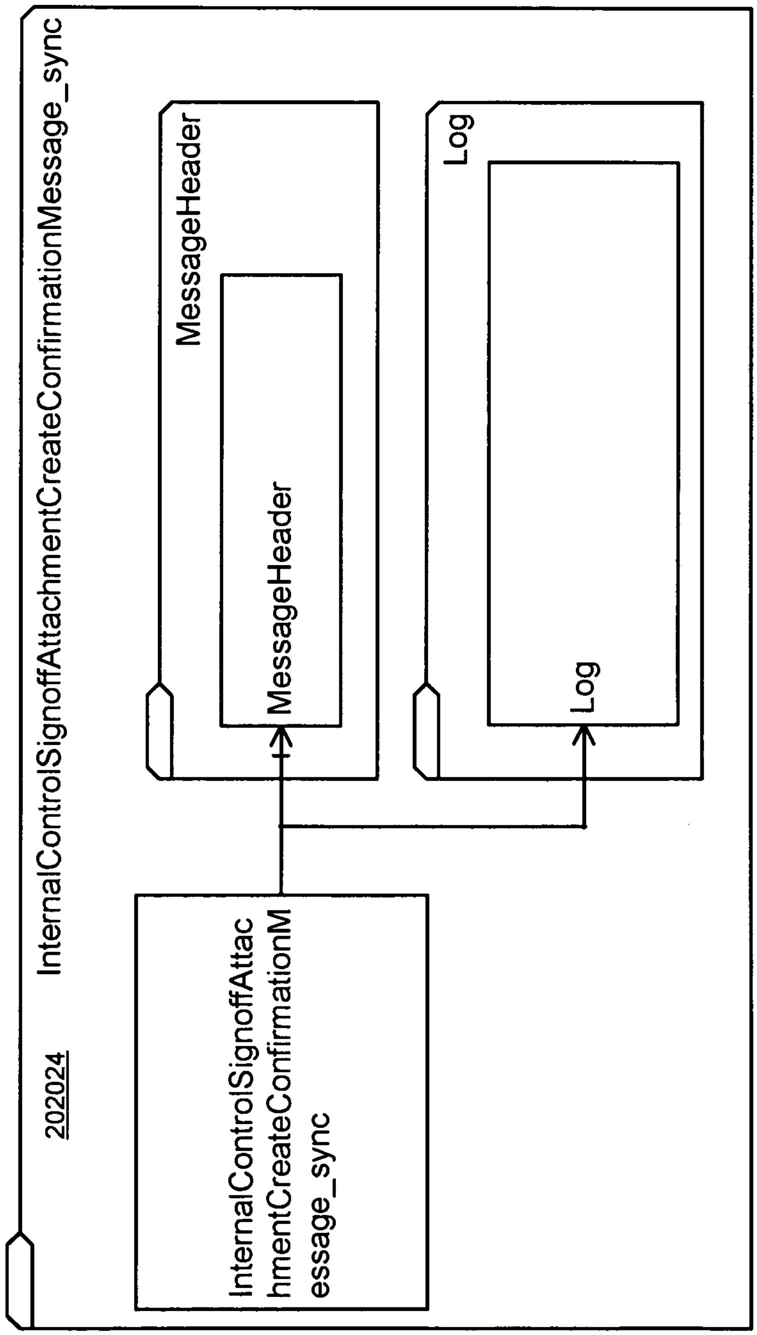
Figure 208:
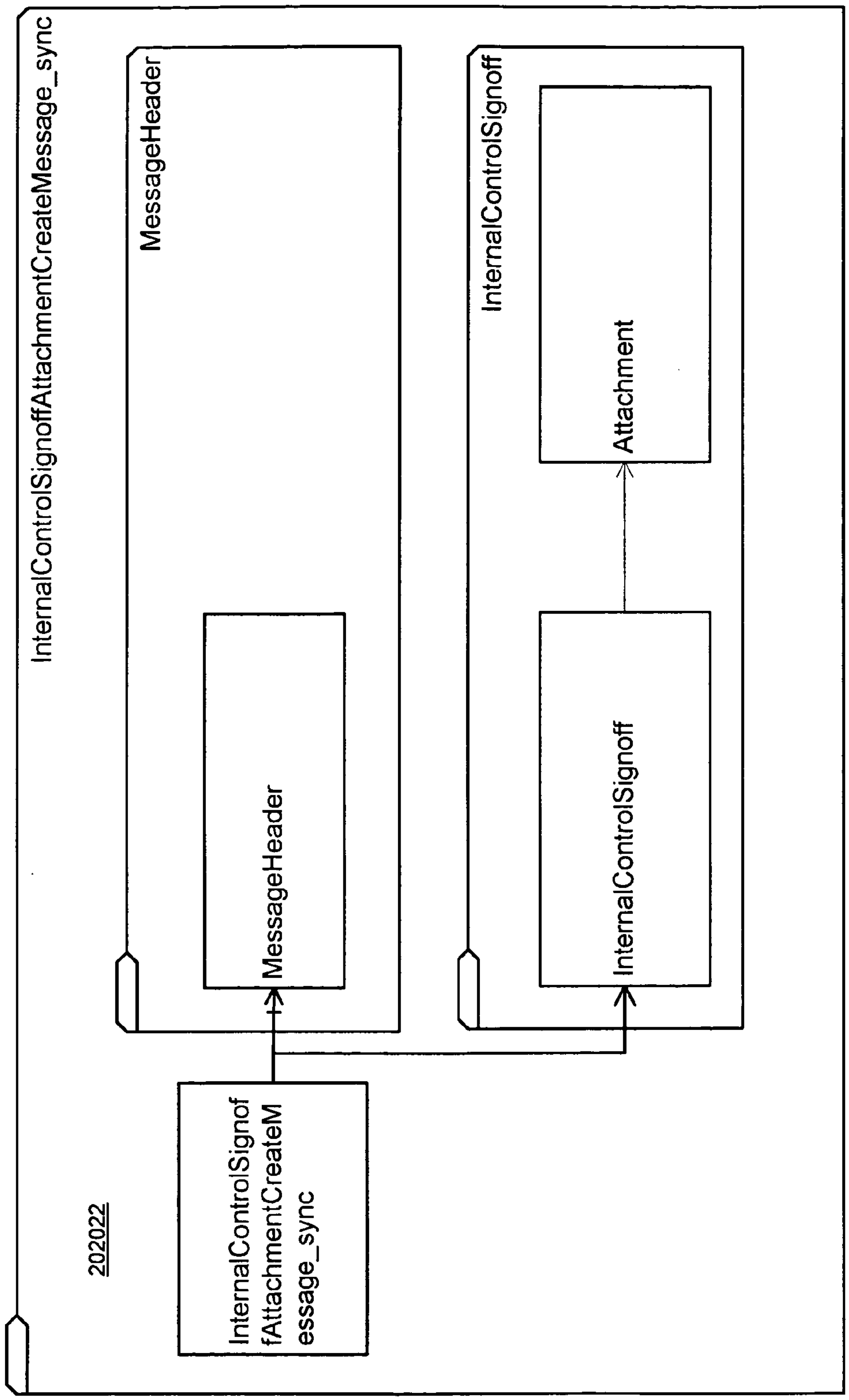
Figure 209:
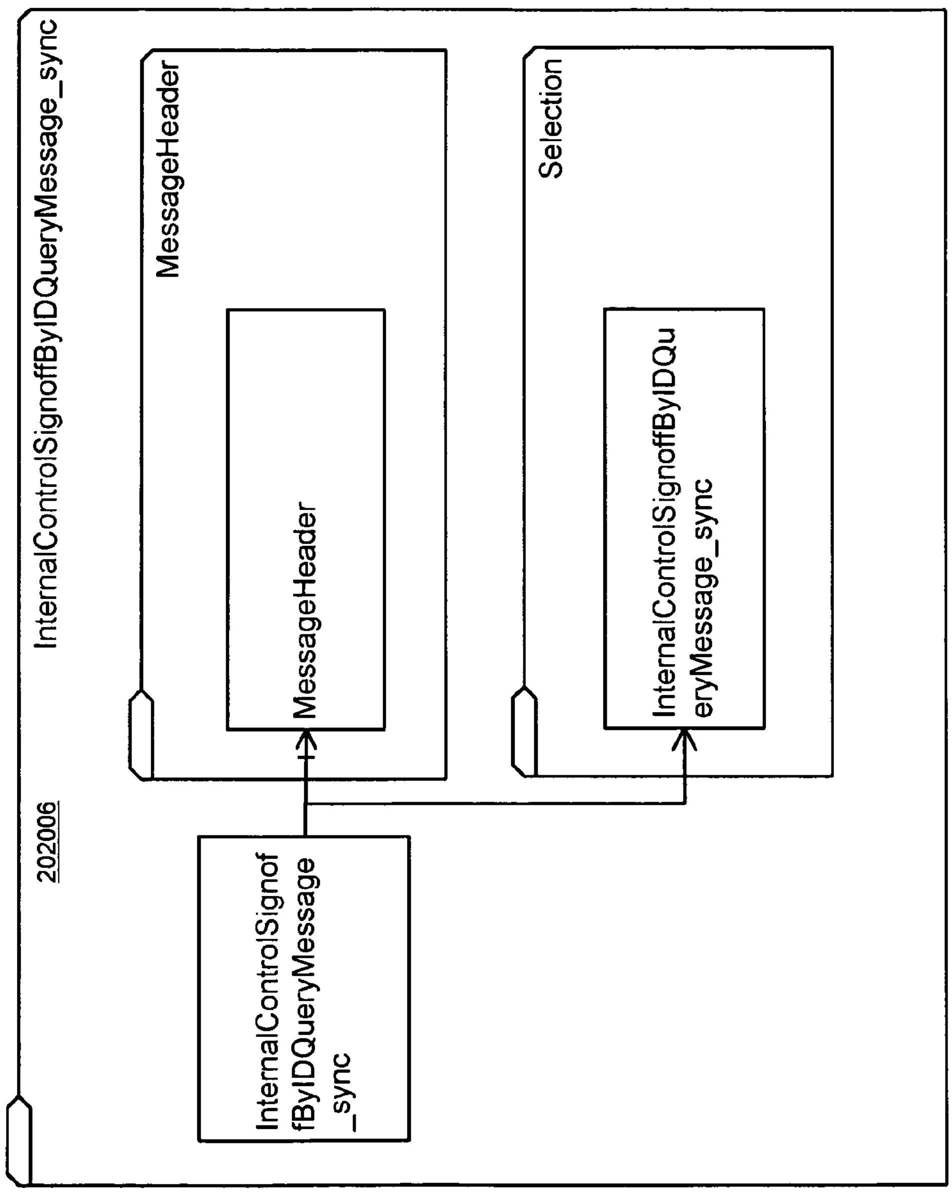
Figure 210:
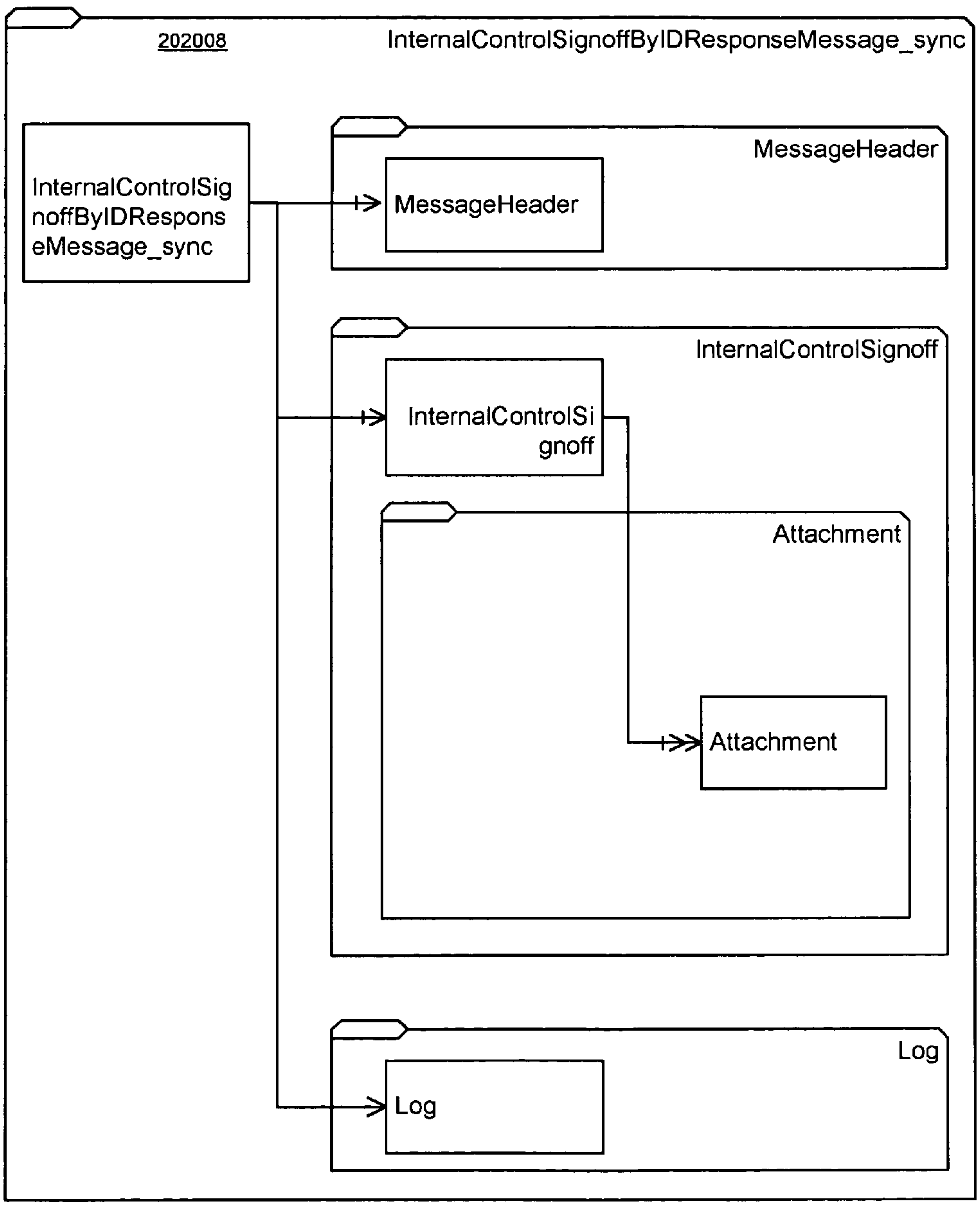
Figure 211:
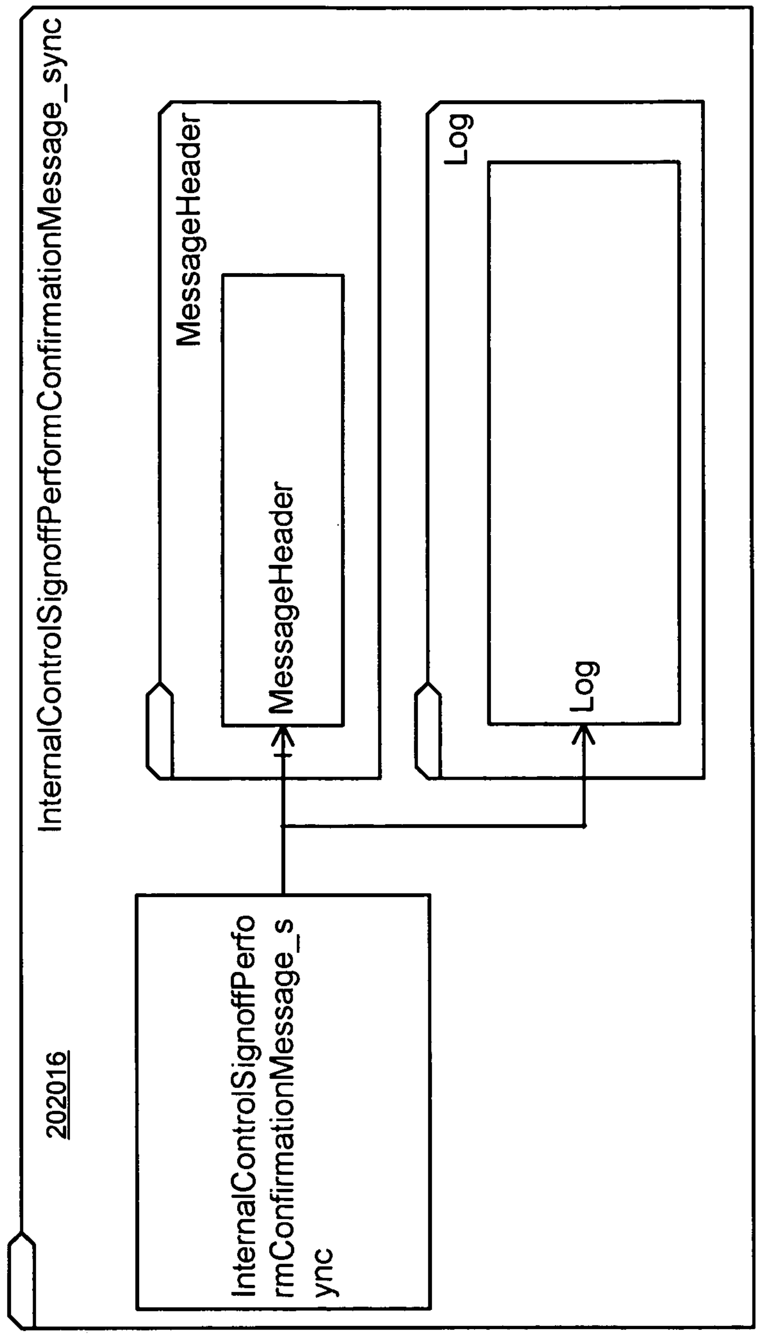
Figure 212:
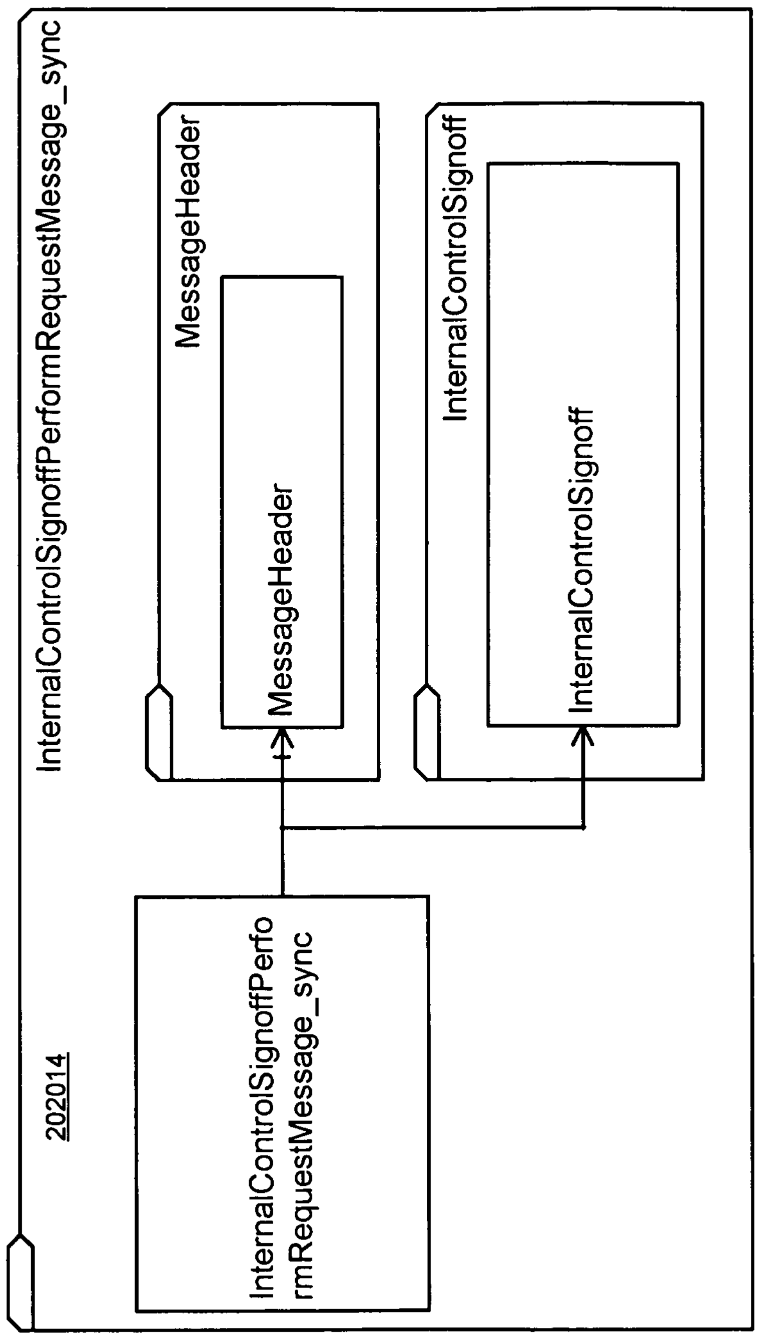
Figure 213:
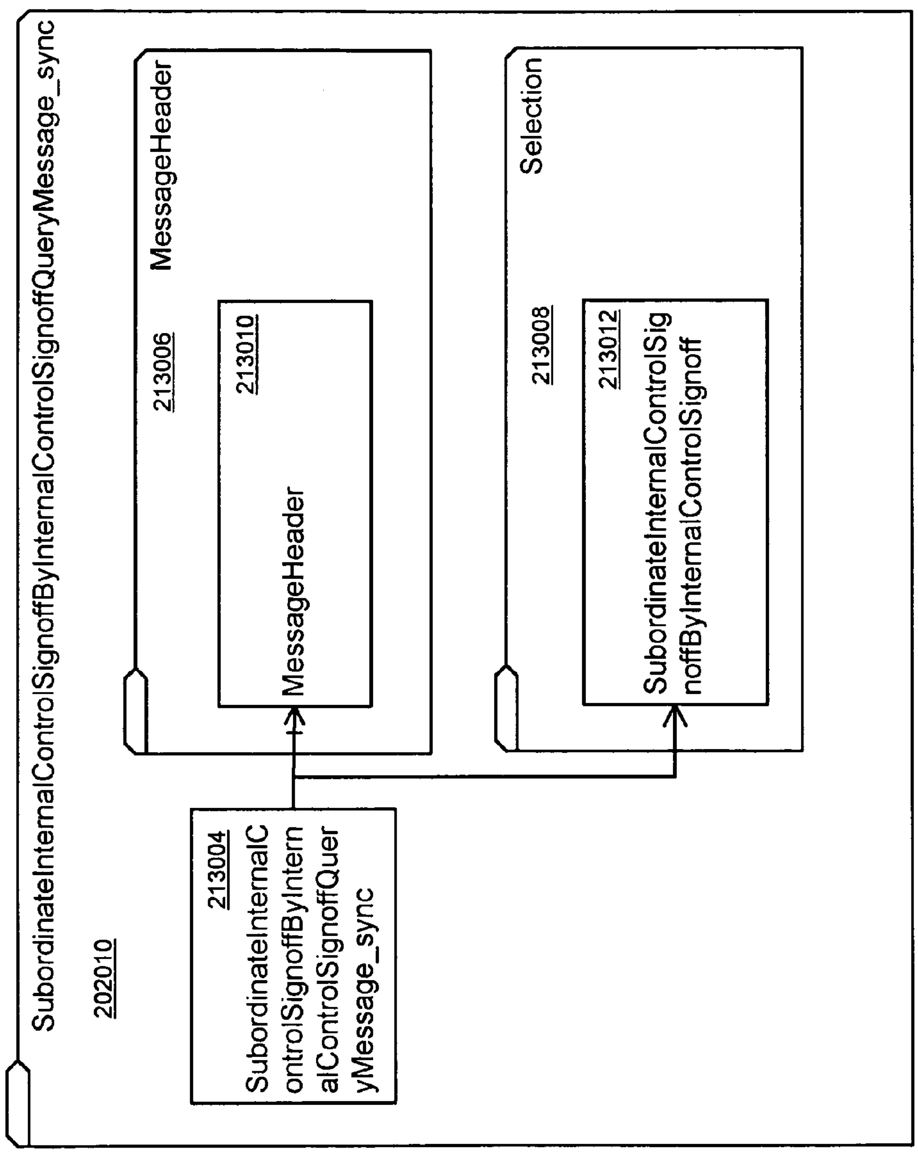
Figure 214:
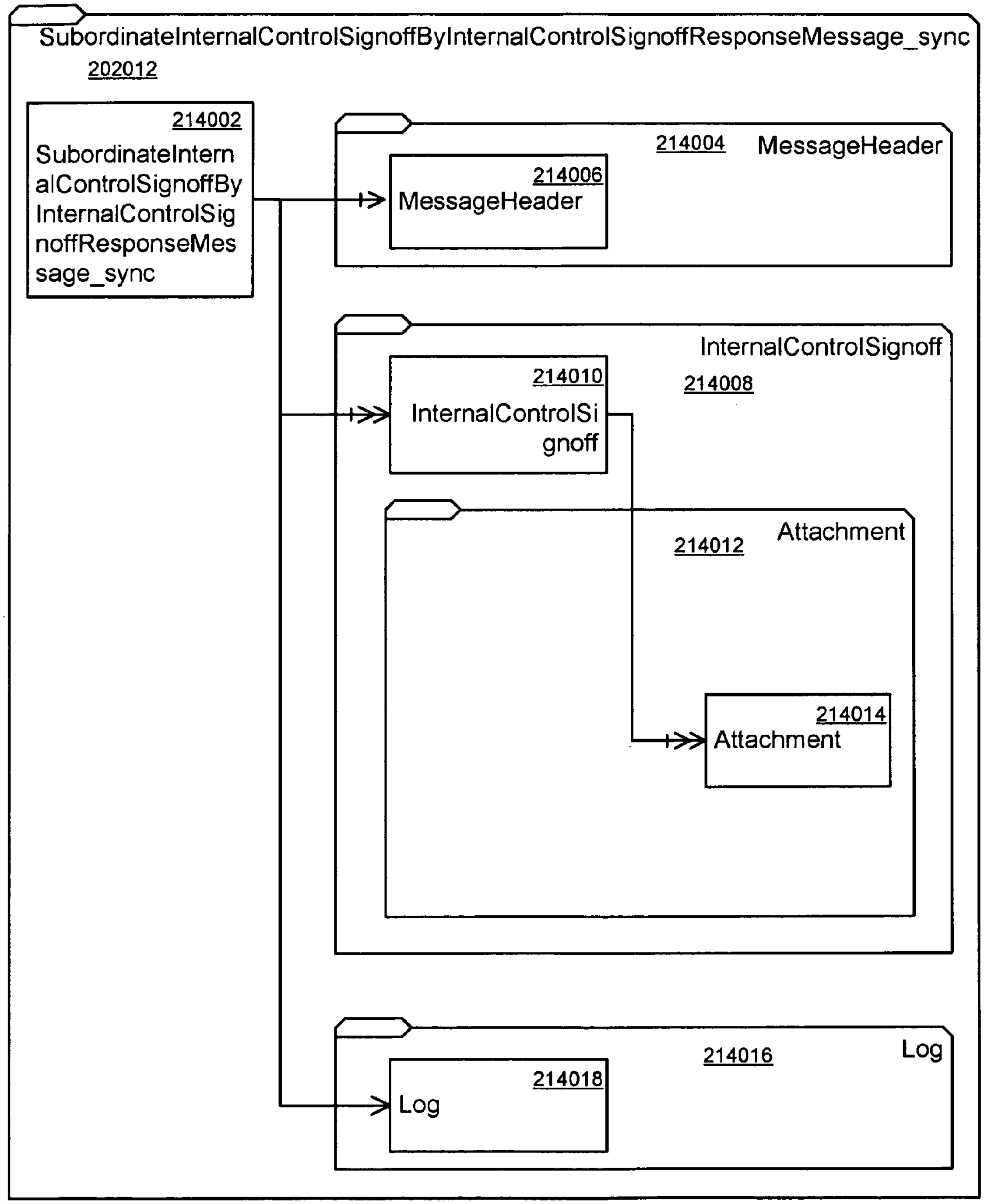
Figure 225:
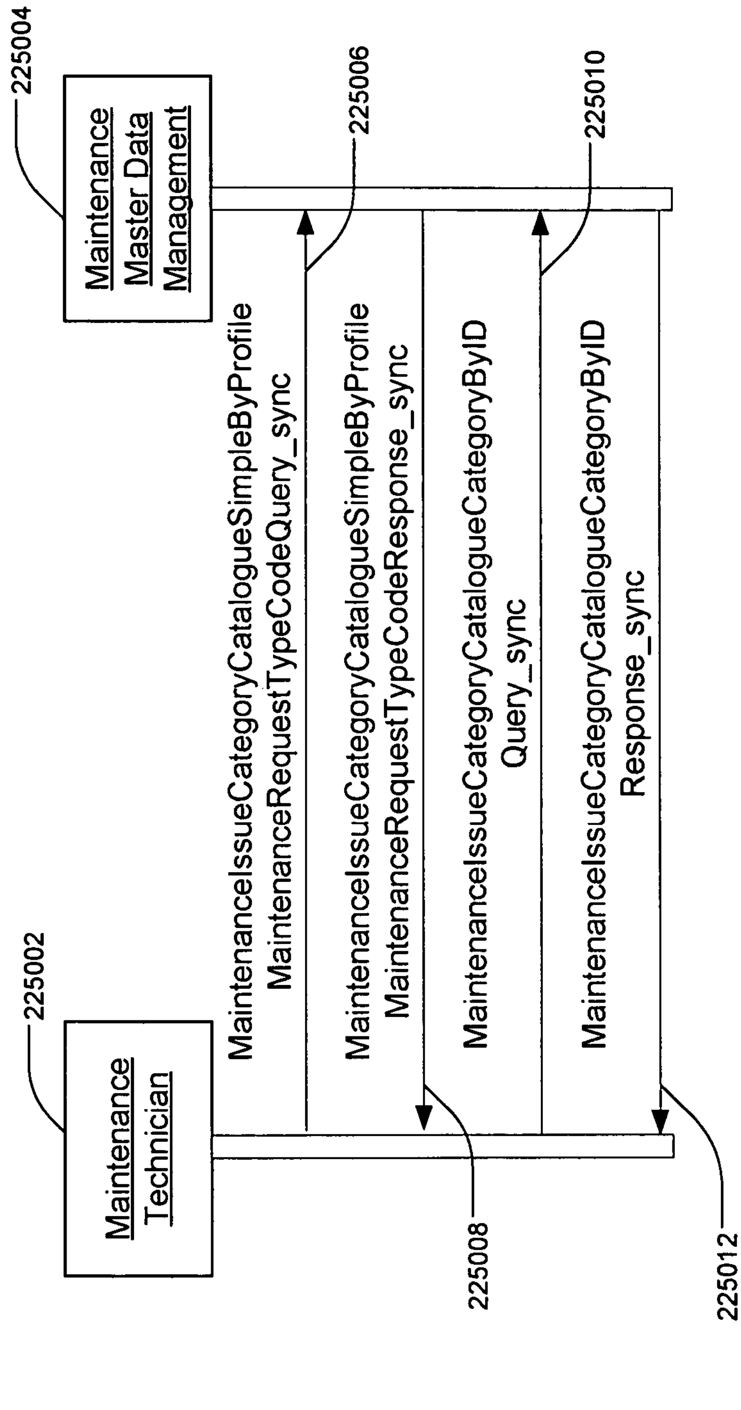
Figure 226:
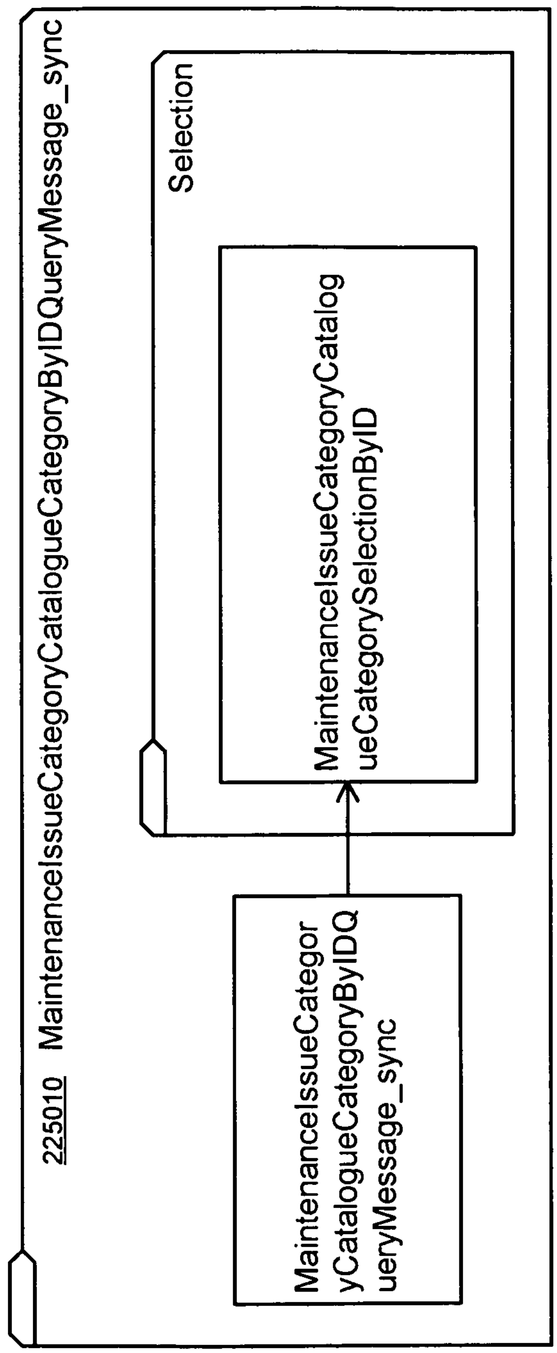
Figure 227:
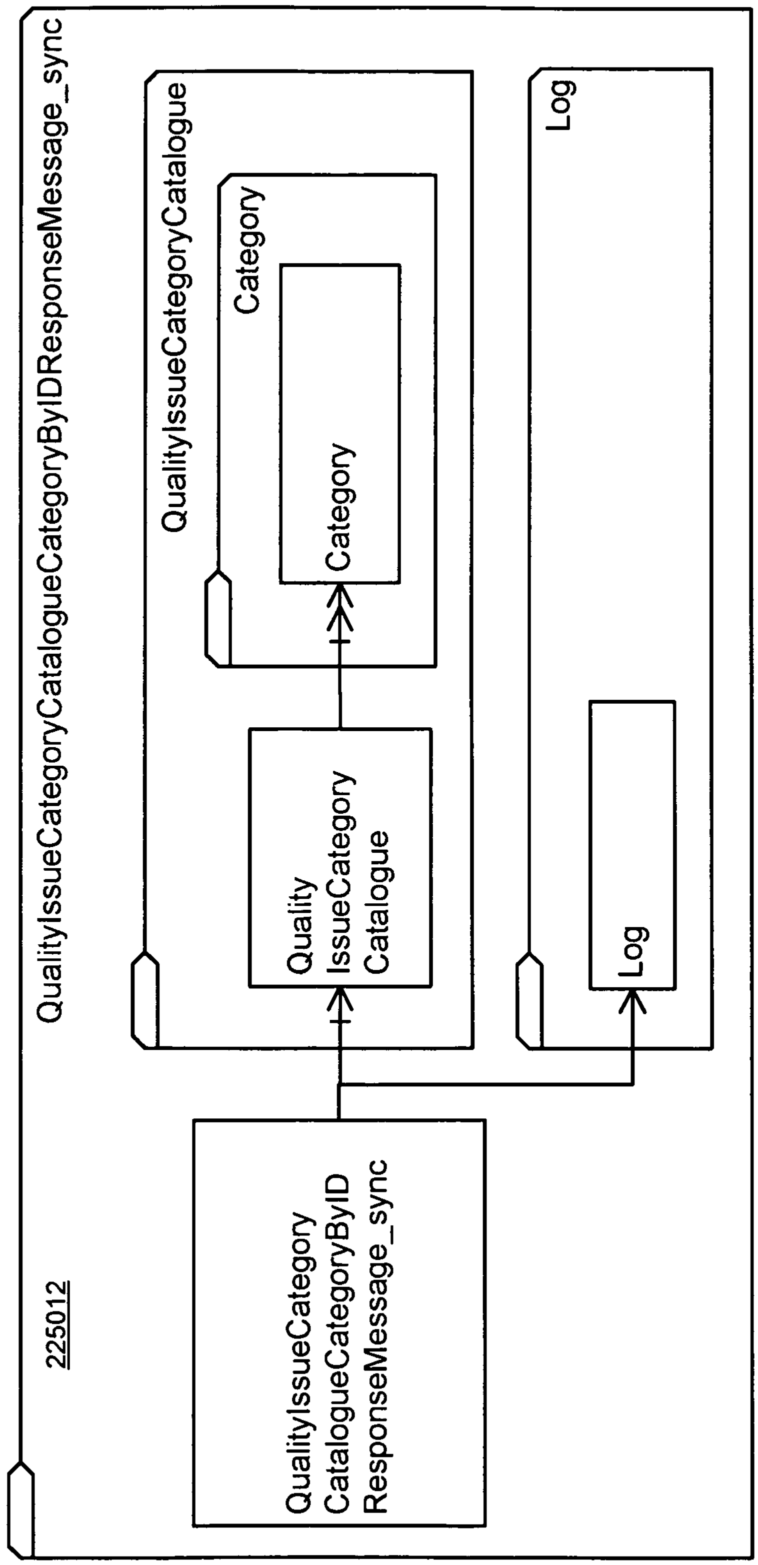
Figure 228:
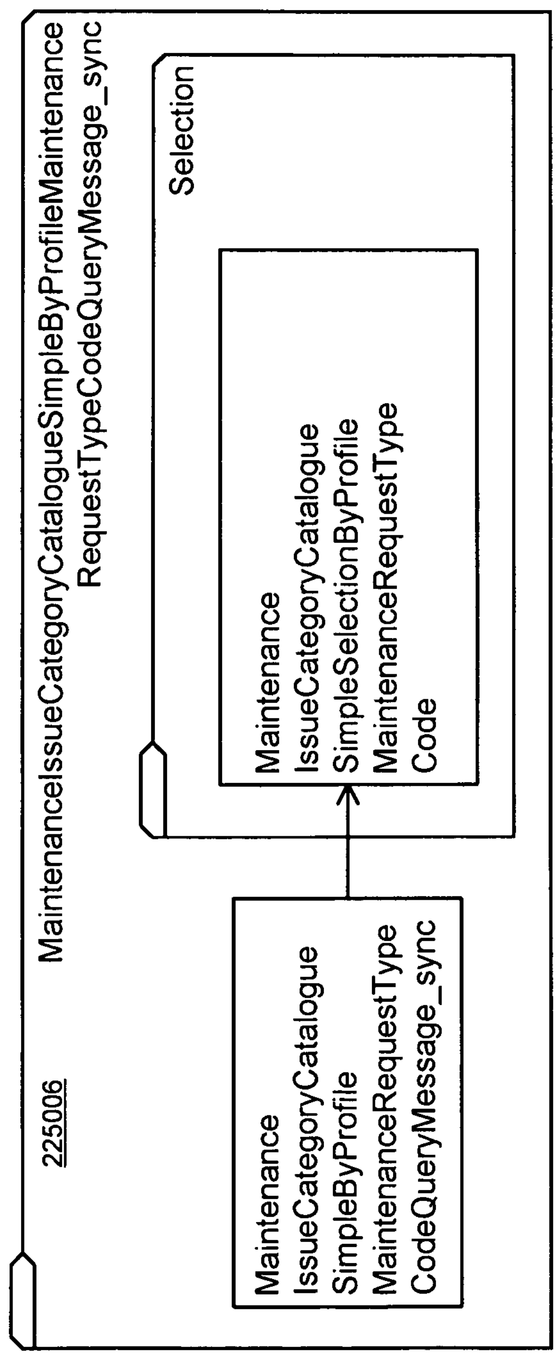
Figure 229:
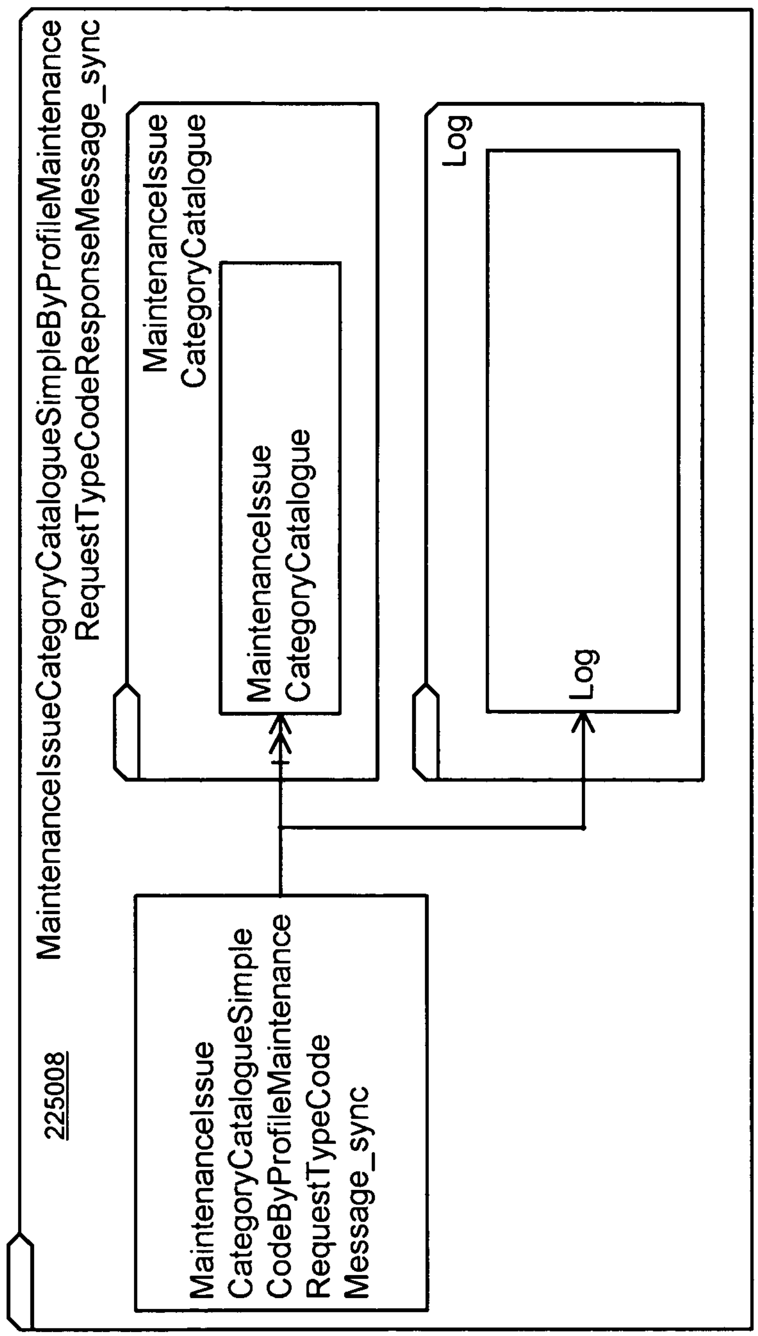
Figure 234:
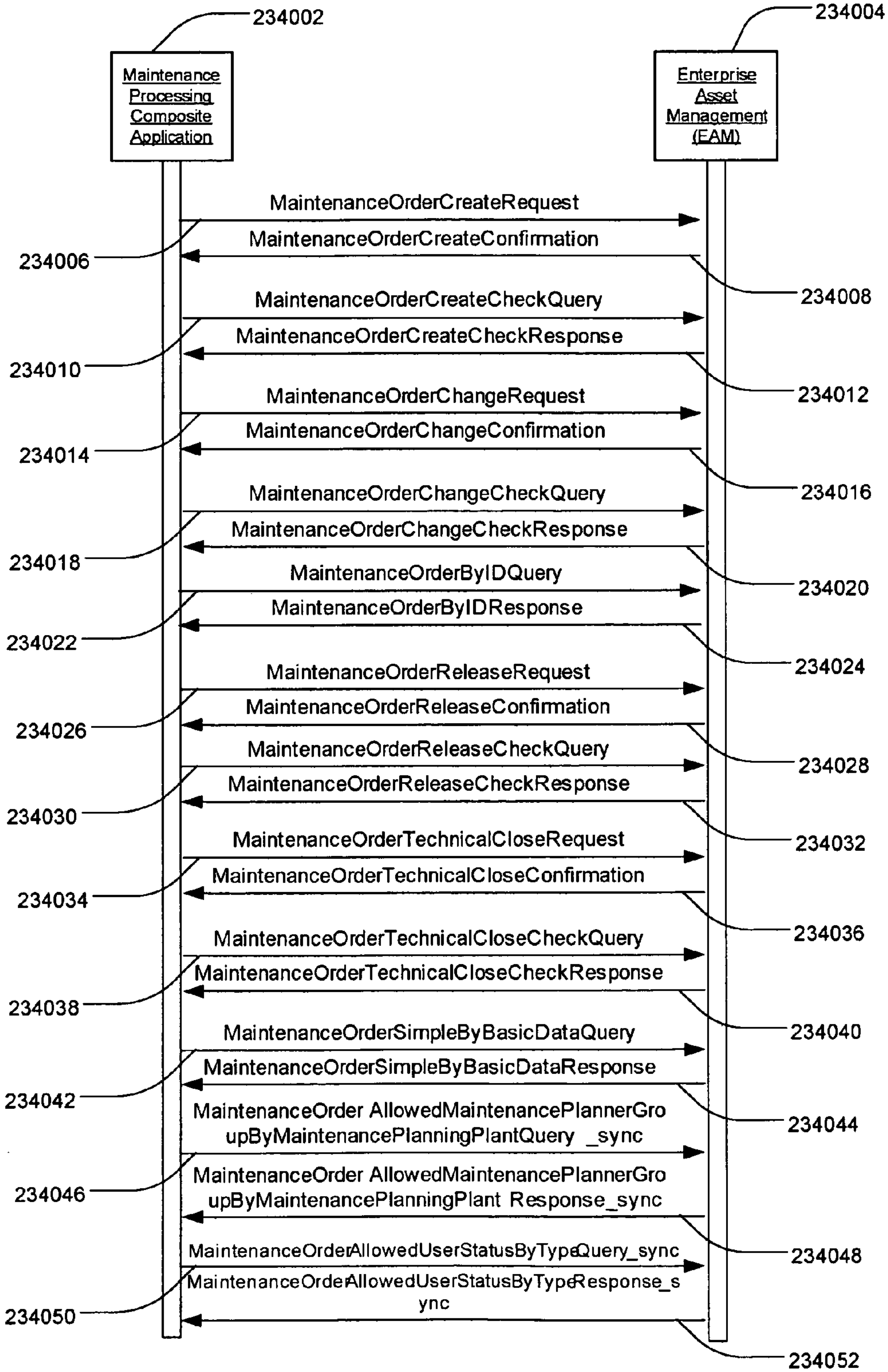
Figure 235:
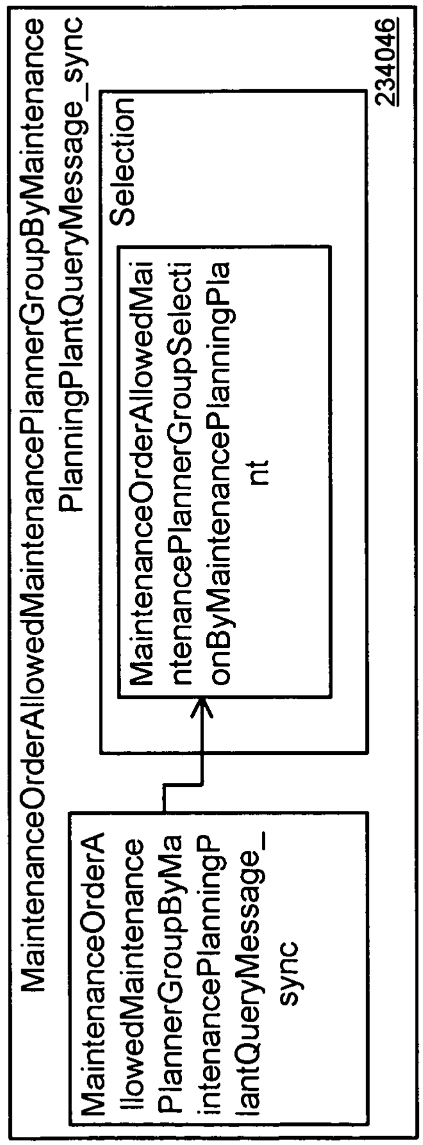
Figure 236:
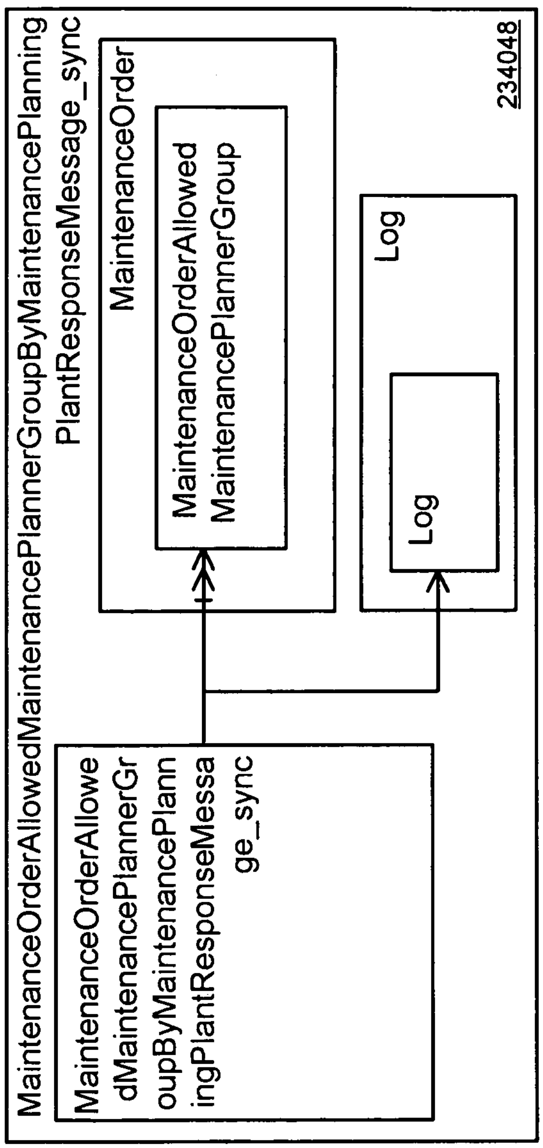
Figure 237:
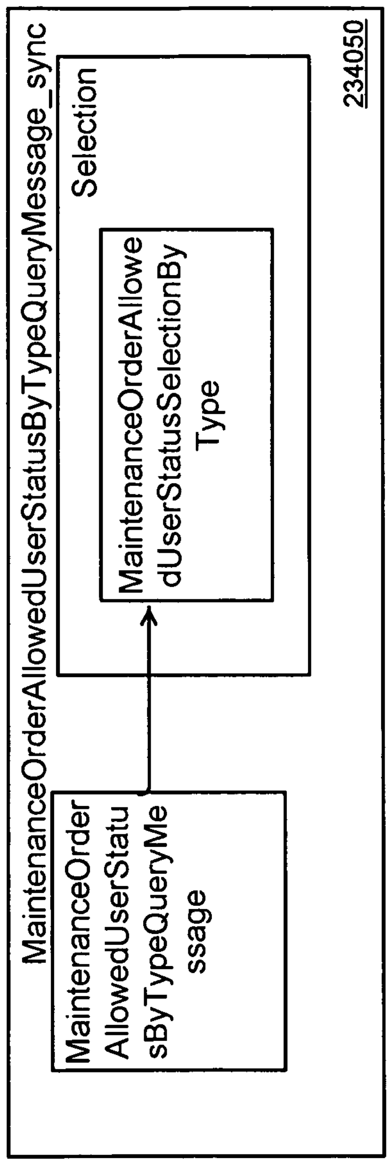
Figure 238:
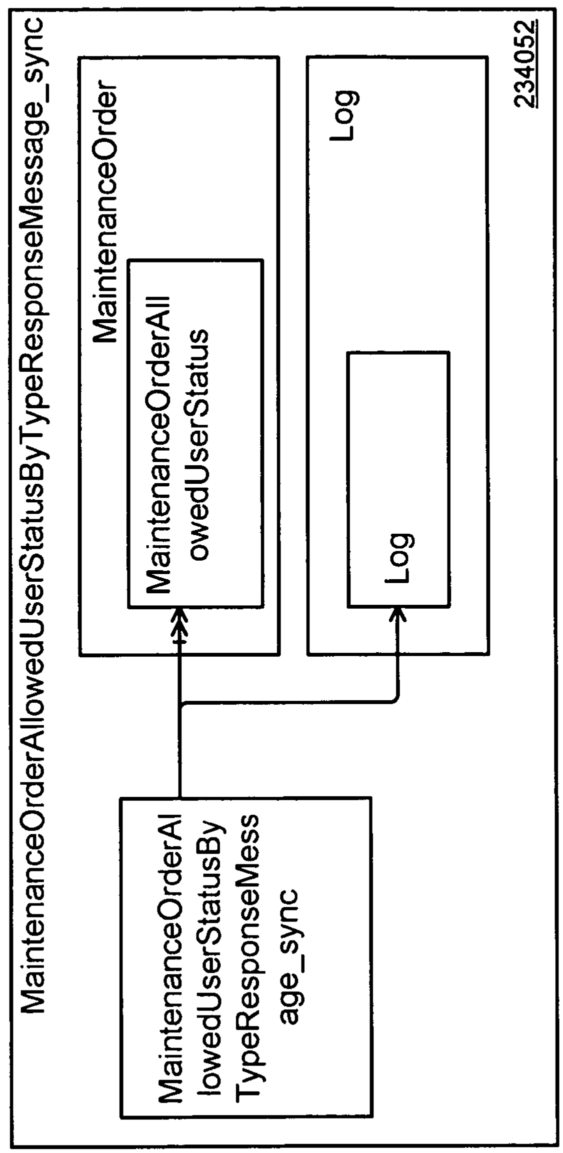
Figure 239:
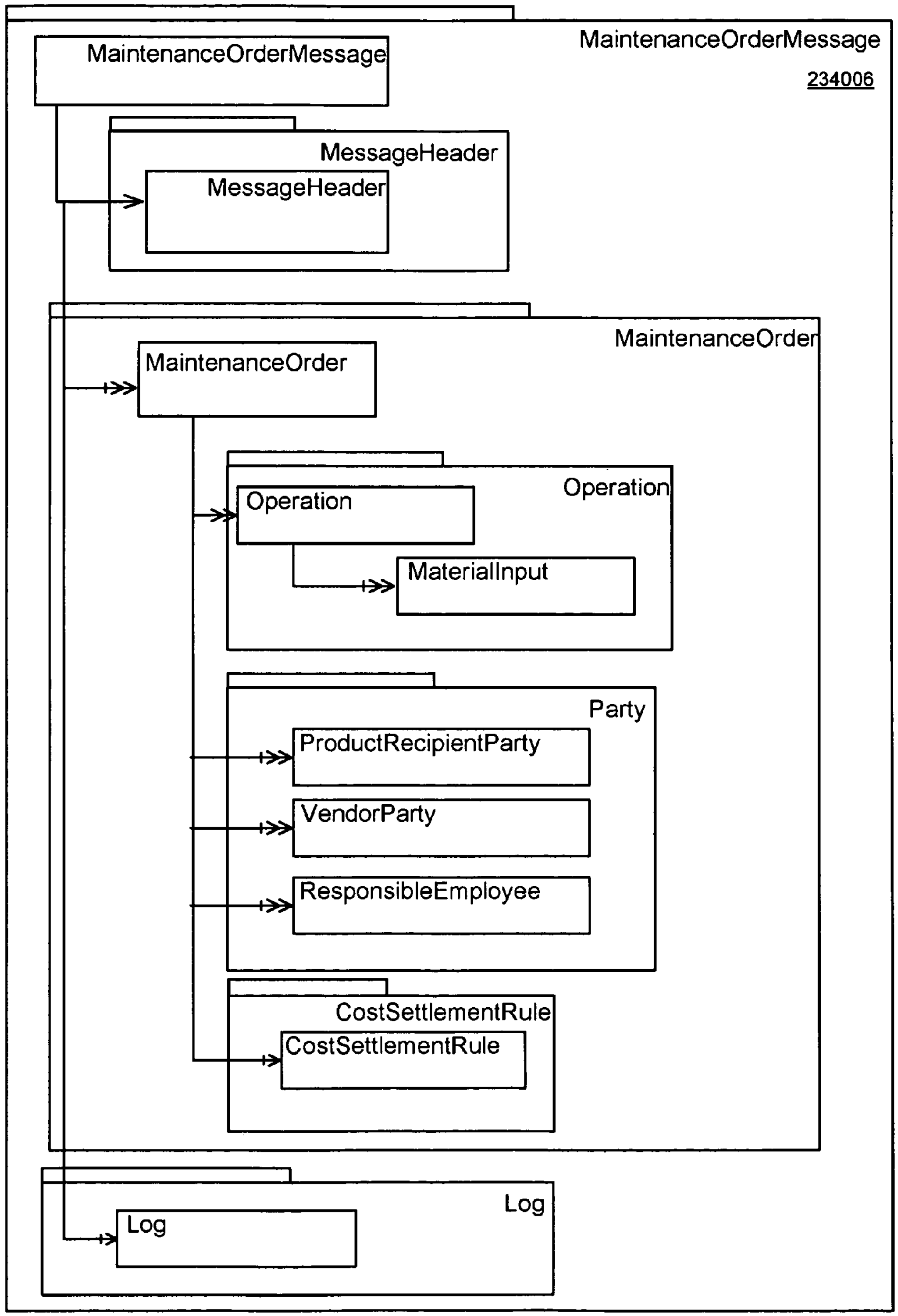
Figure 240:
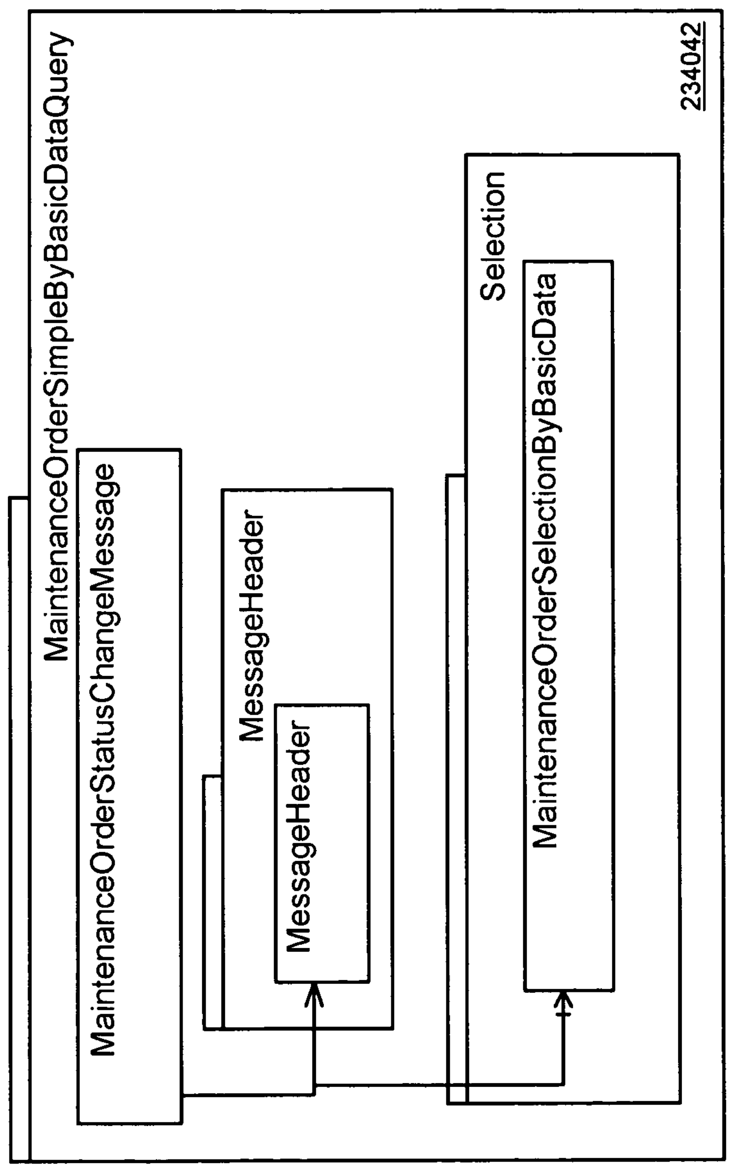
Figure 241:
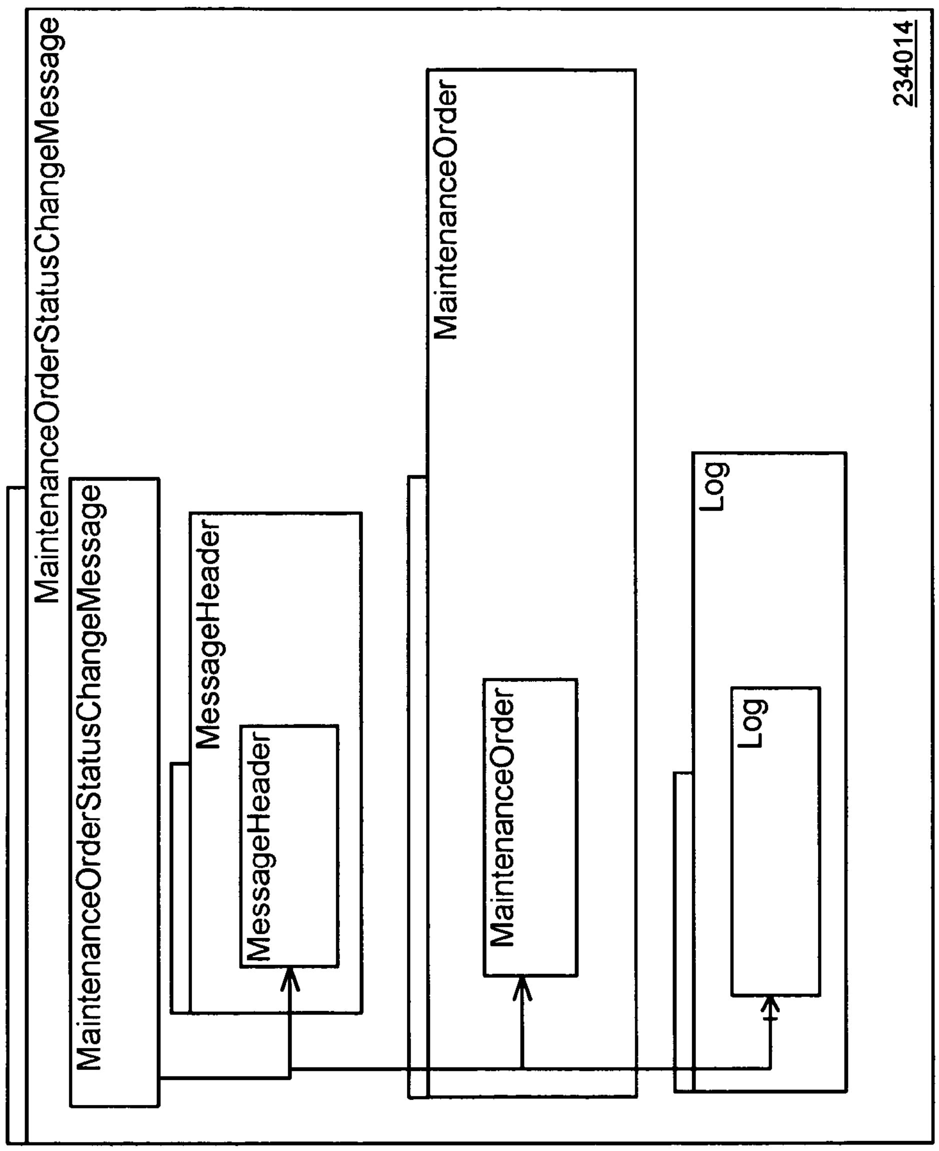
Figure 253:
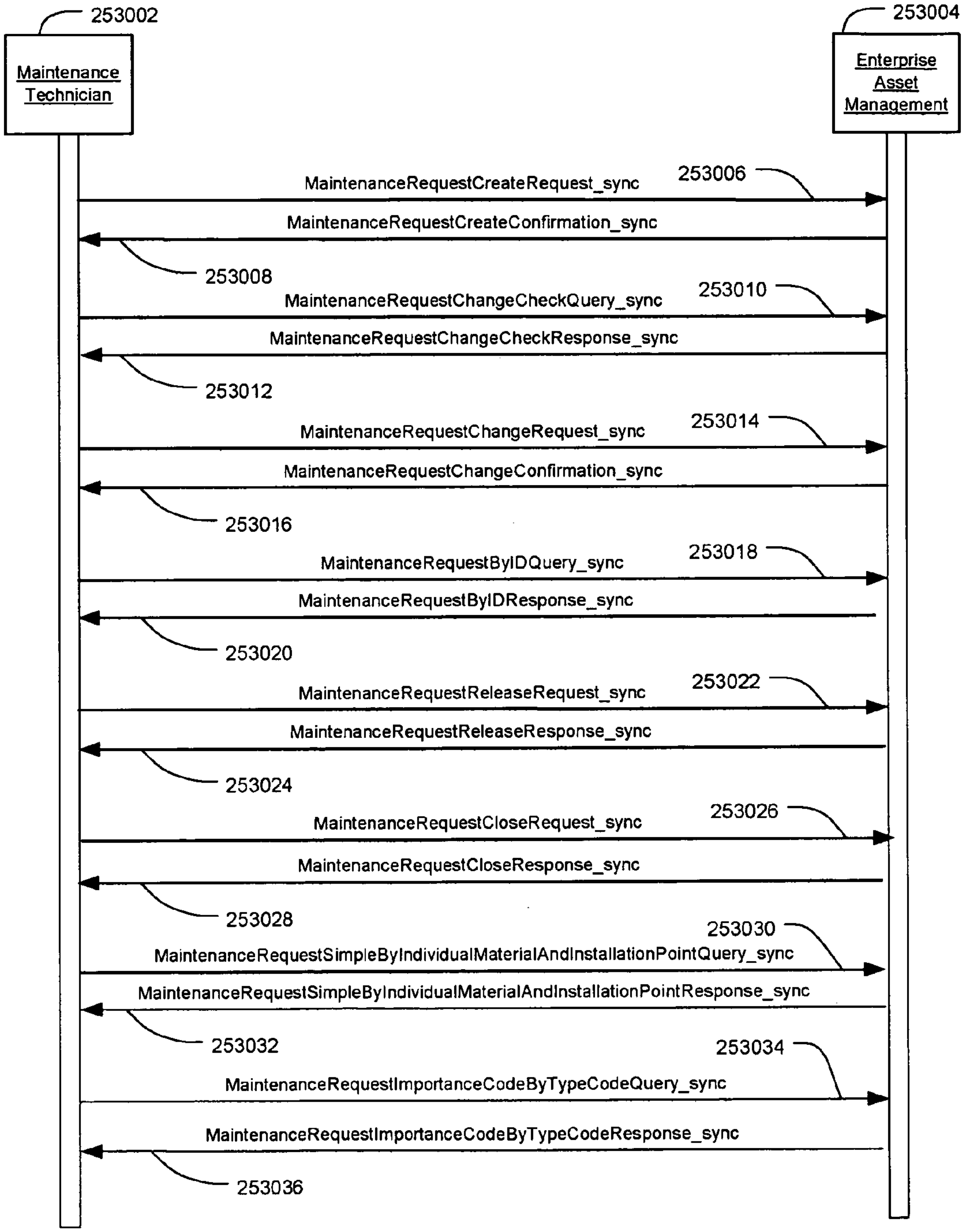
Figure 254:
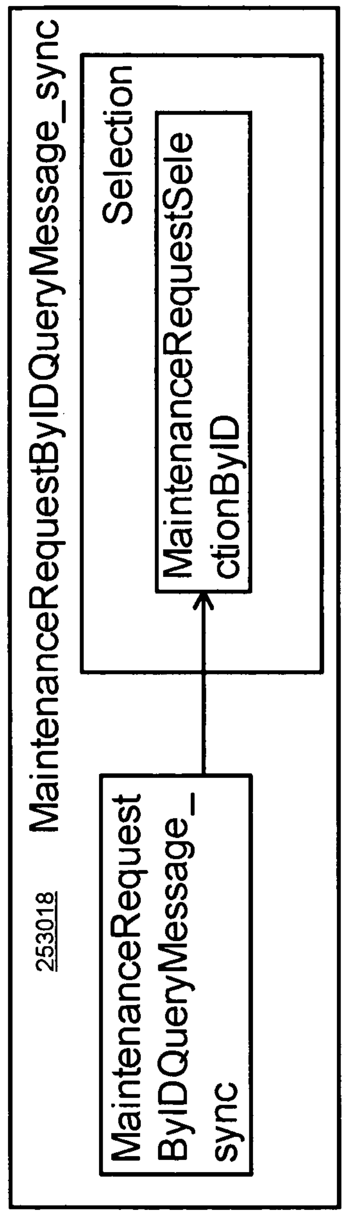
Figure 255:
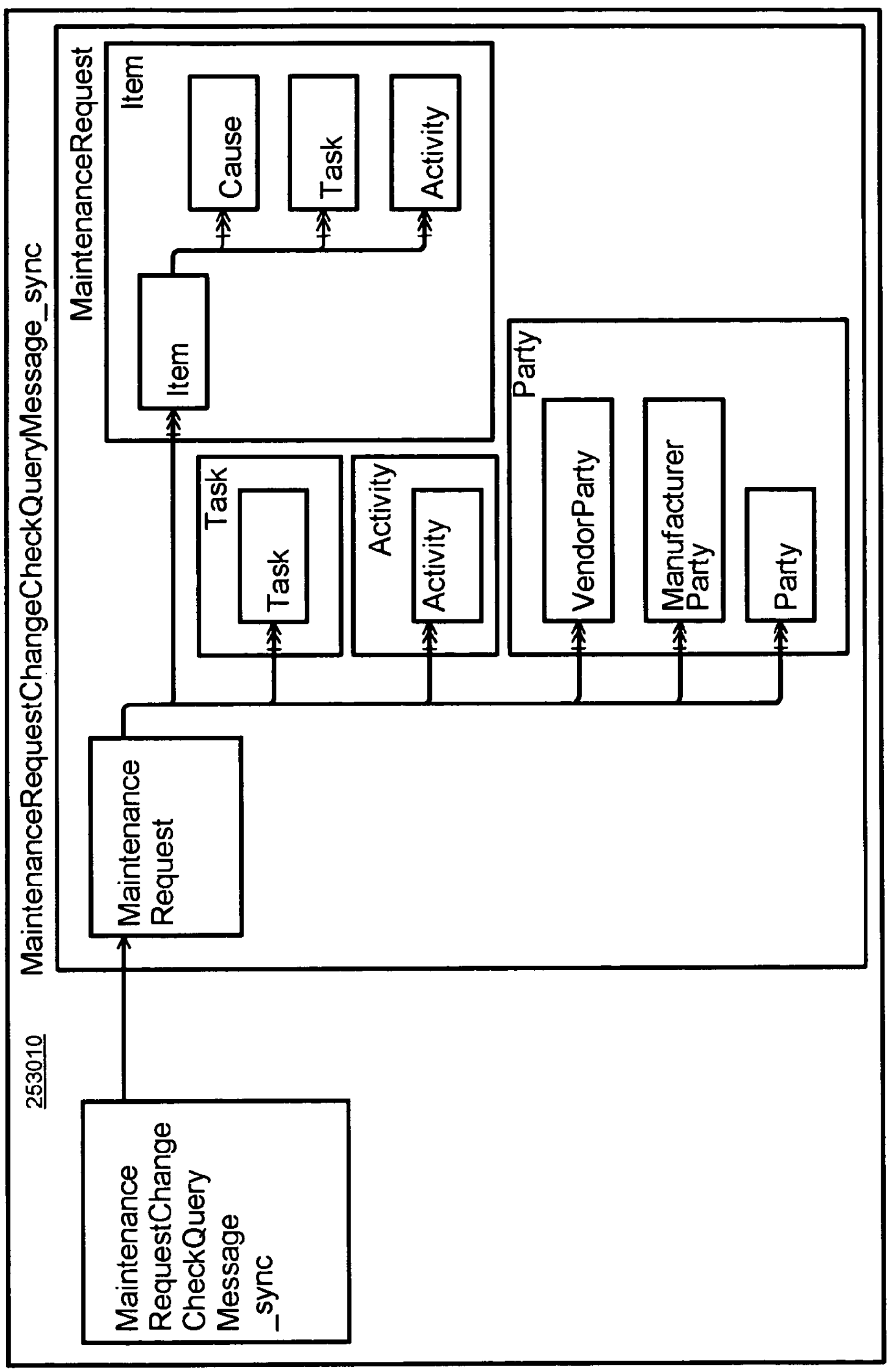
Figure 256:
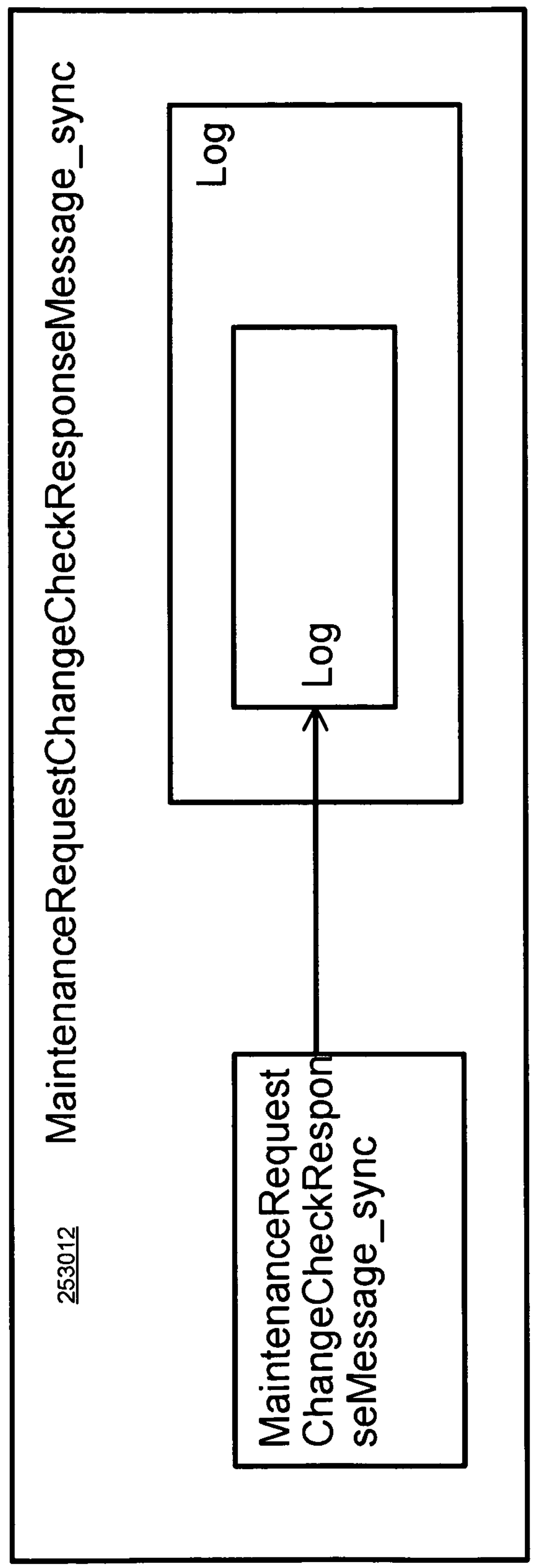
Figure 257:
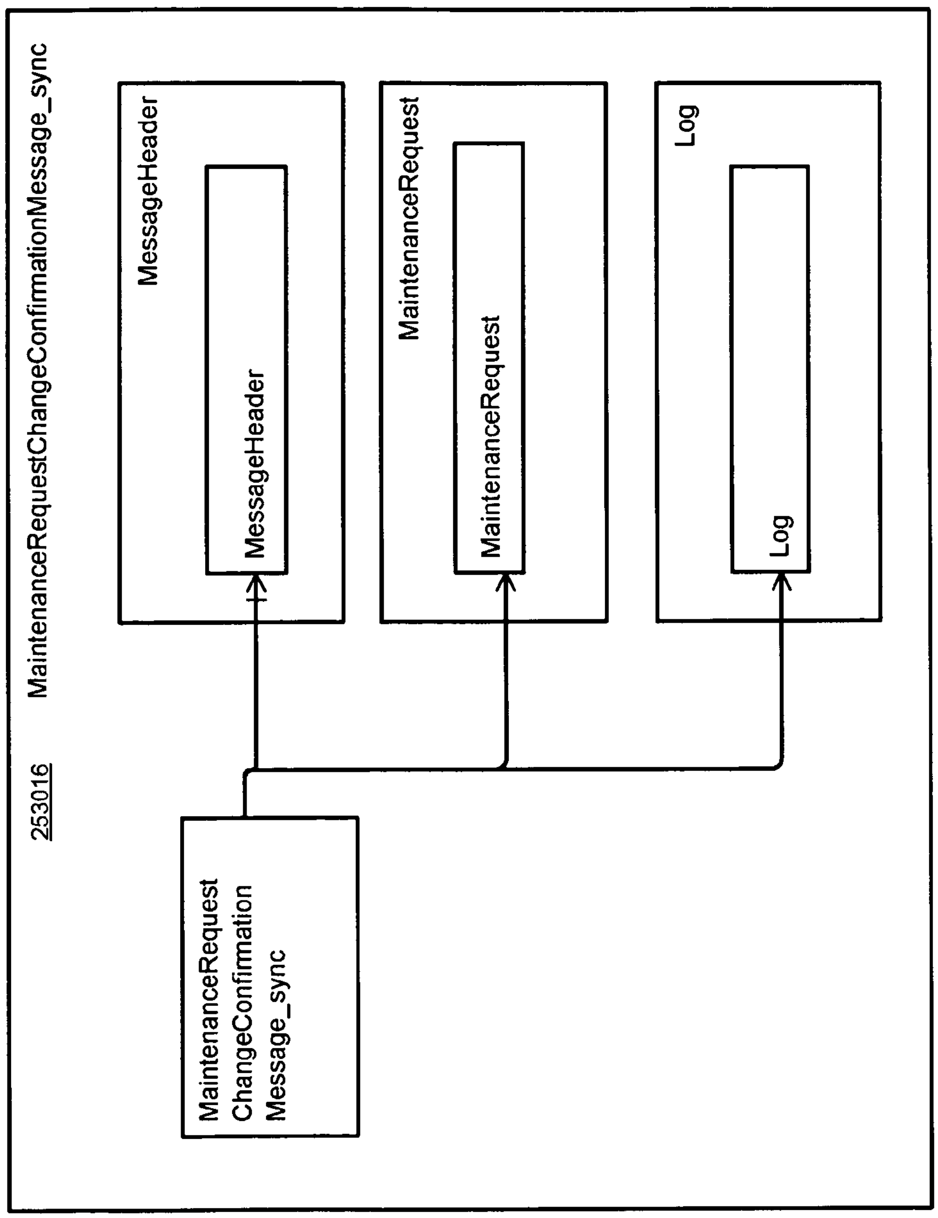
Figure 258:
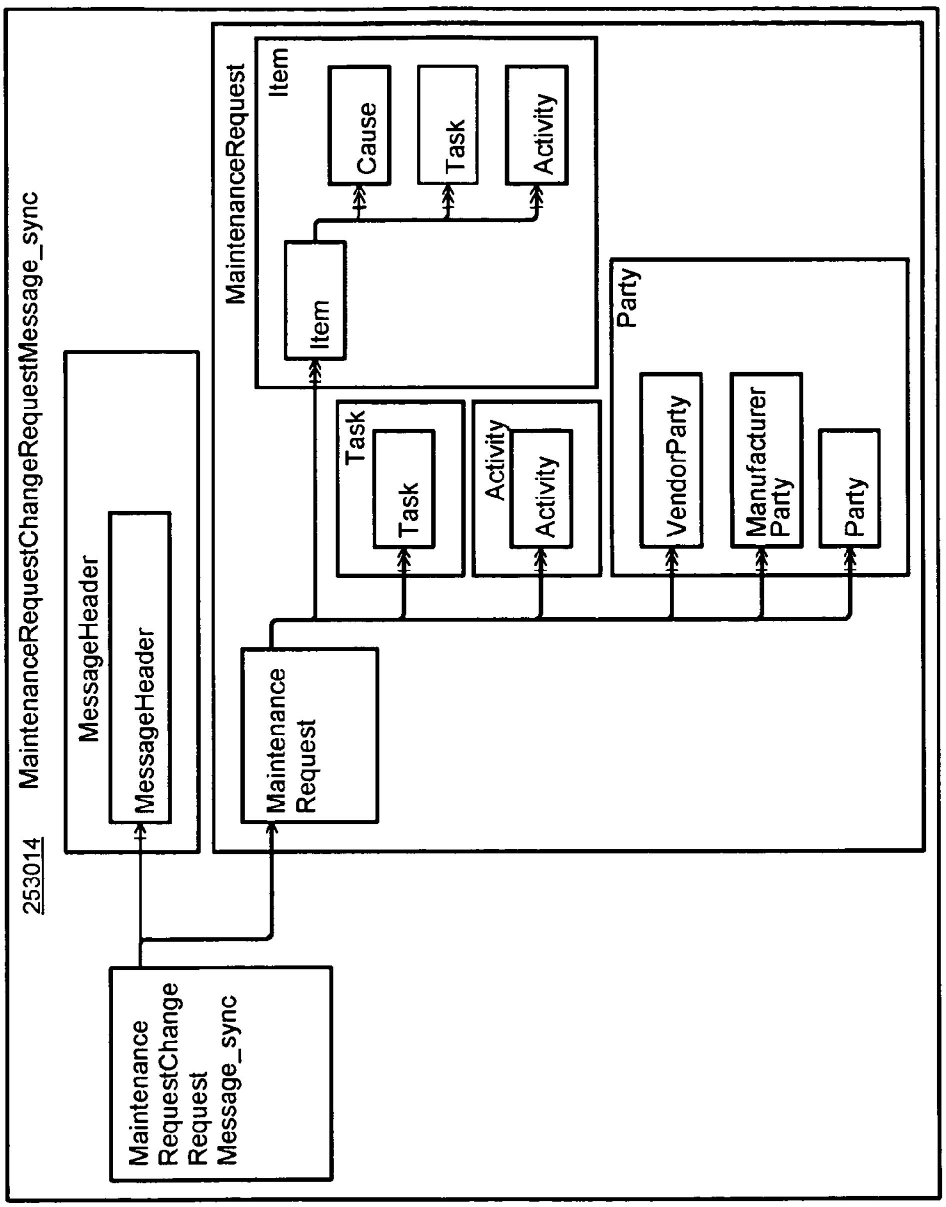
Figure 259:
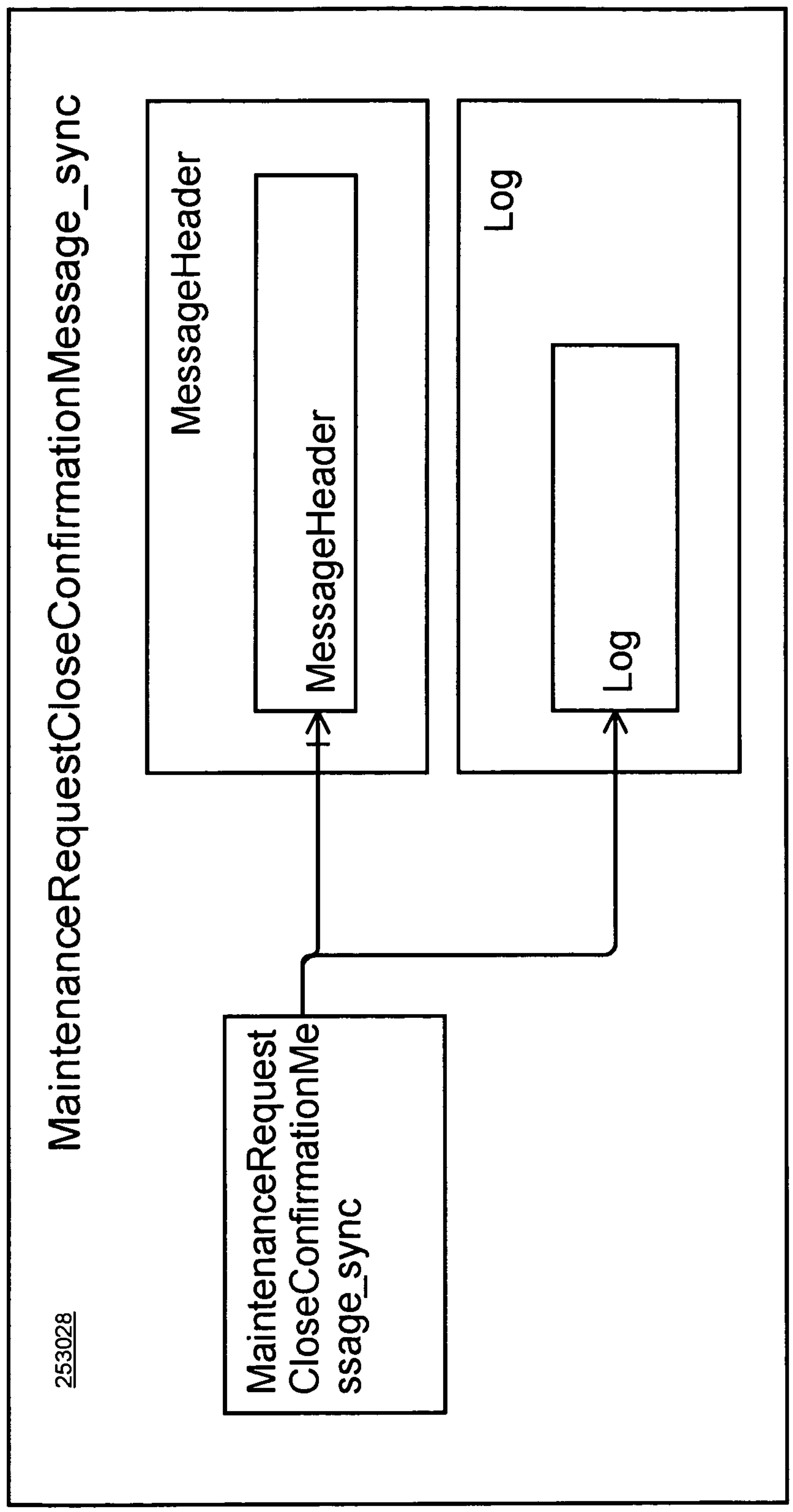
Figure 260:
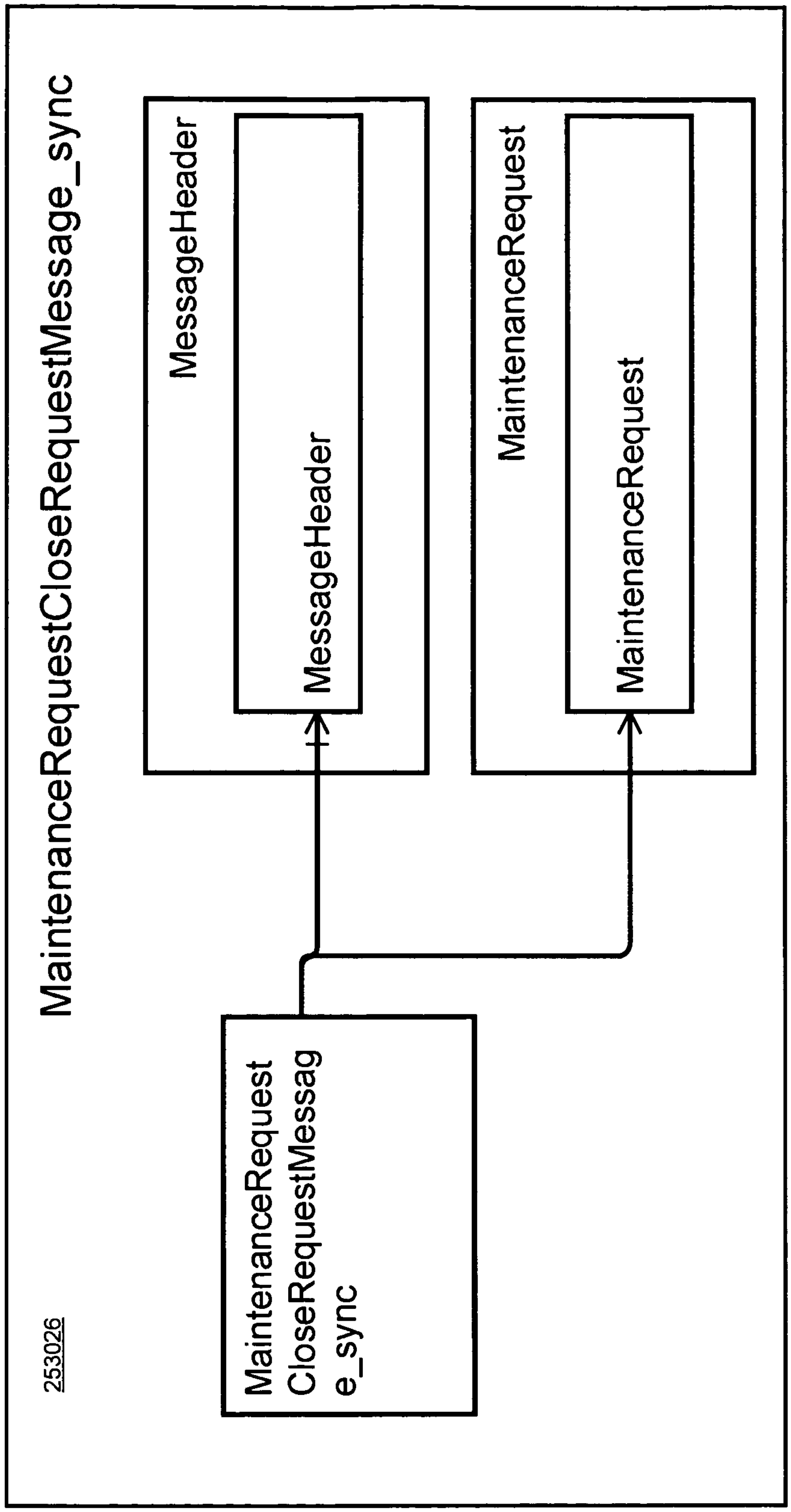
Figure 261:
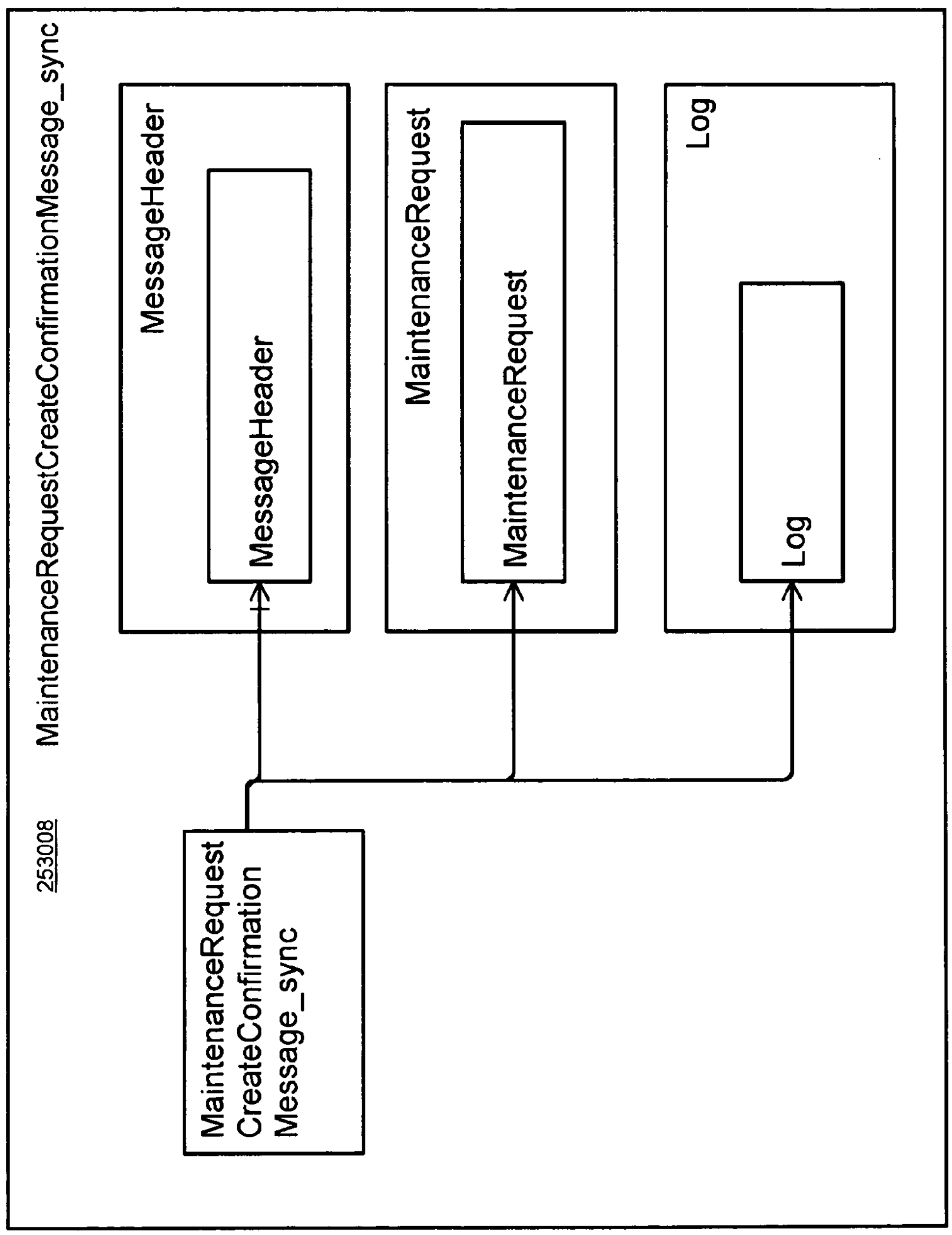
Figure 262:
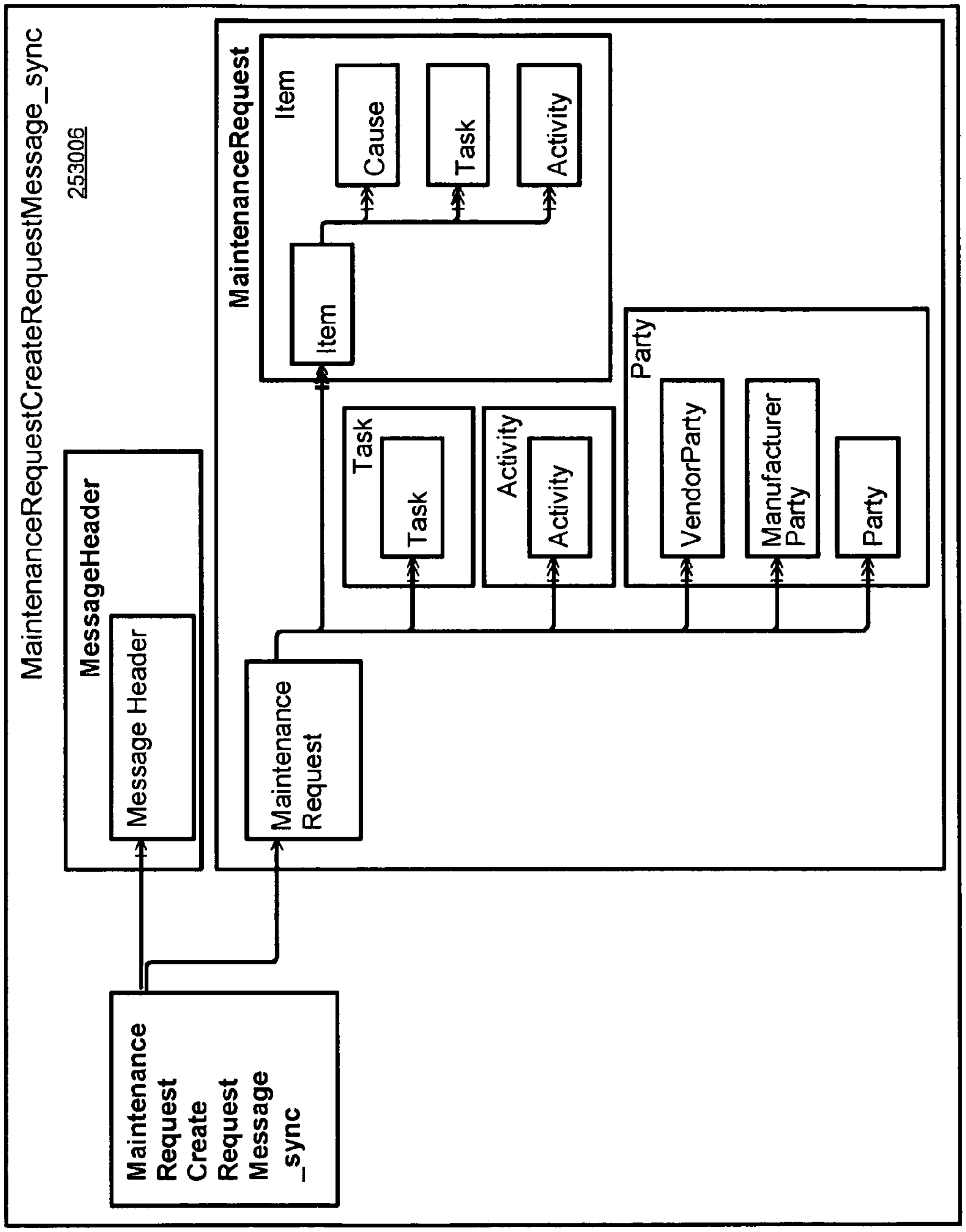
Figure 263:
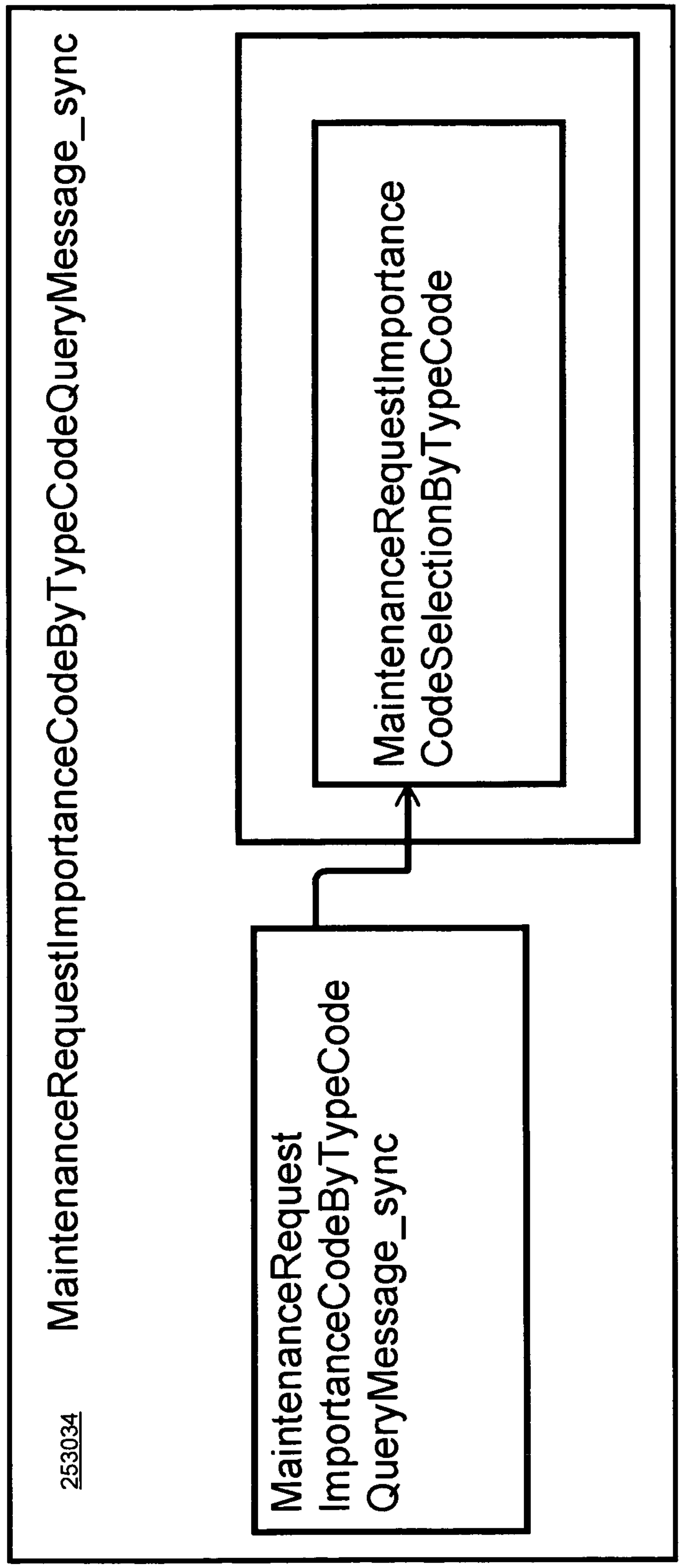
Figure 264:
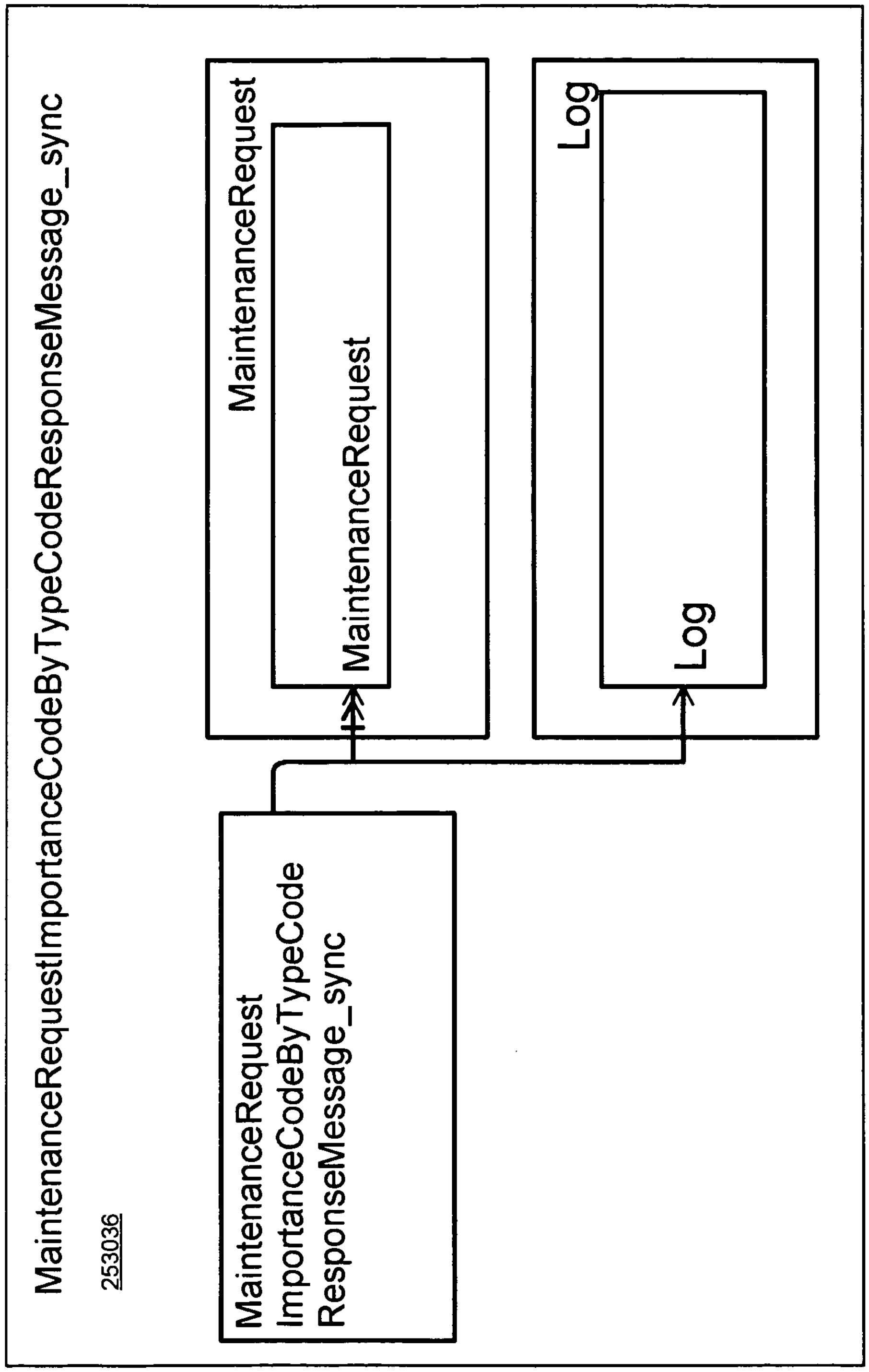
Figure 265:
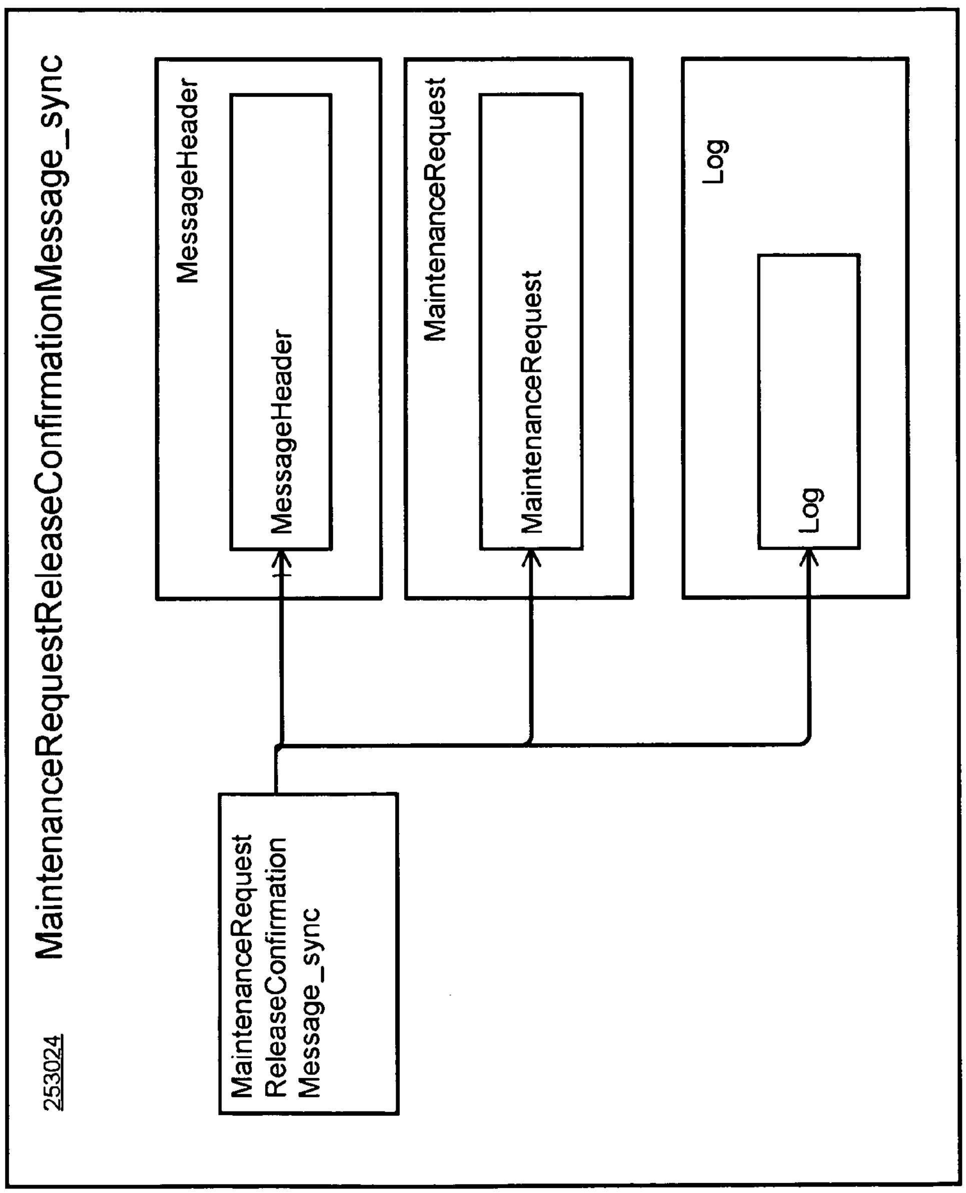
Figure 266:
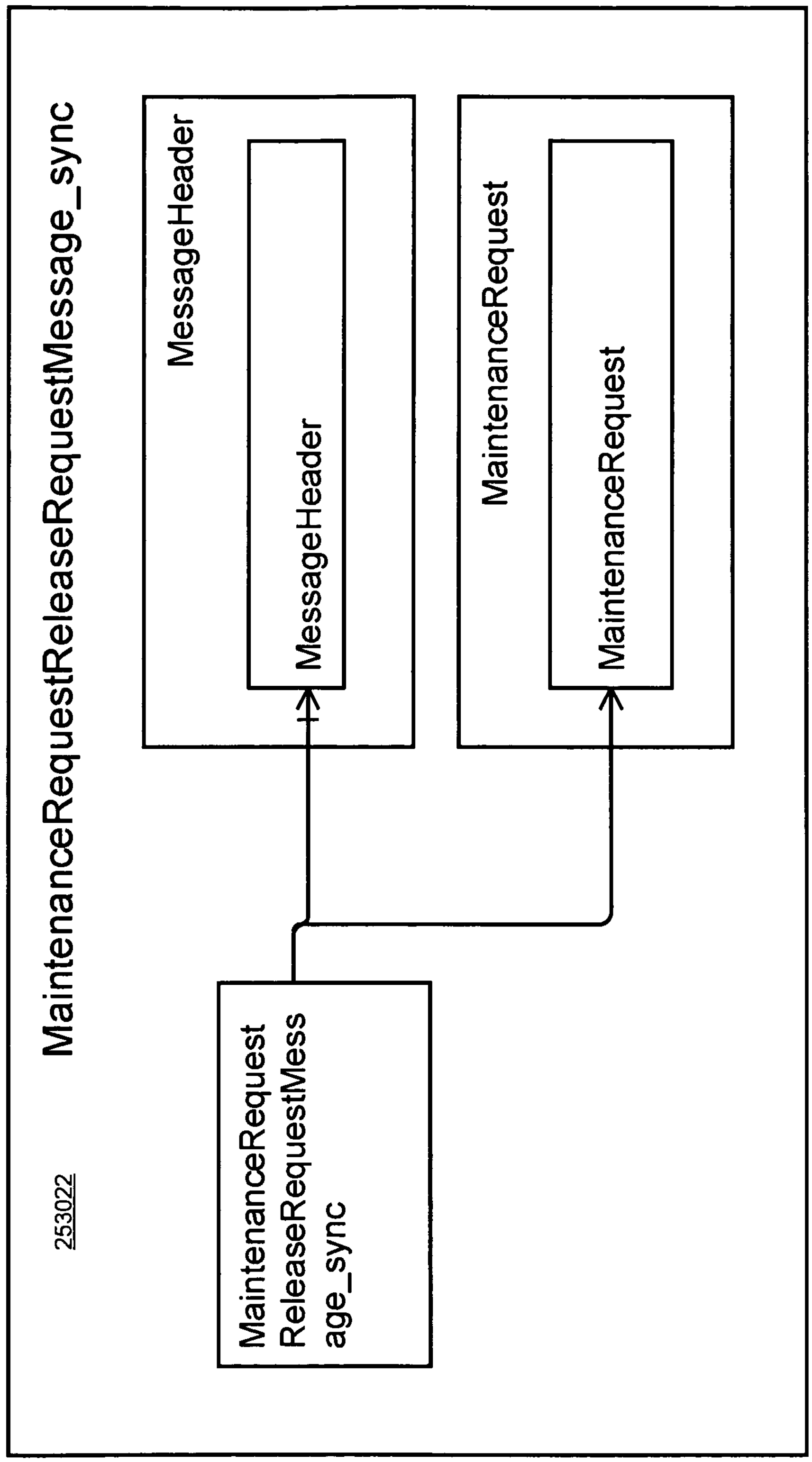
Figure 267:
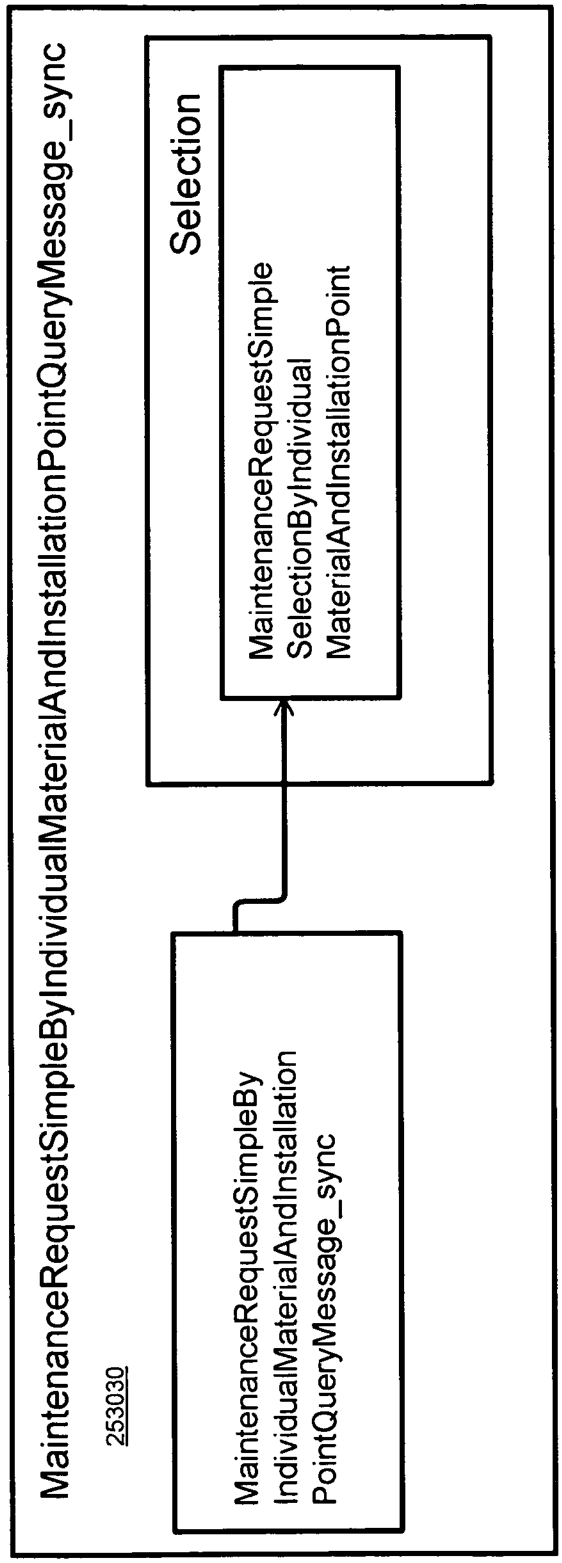
Figure 268:
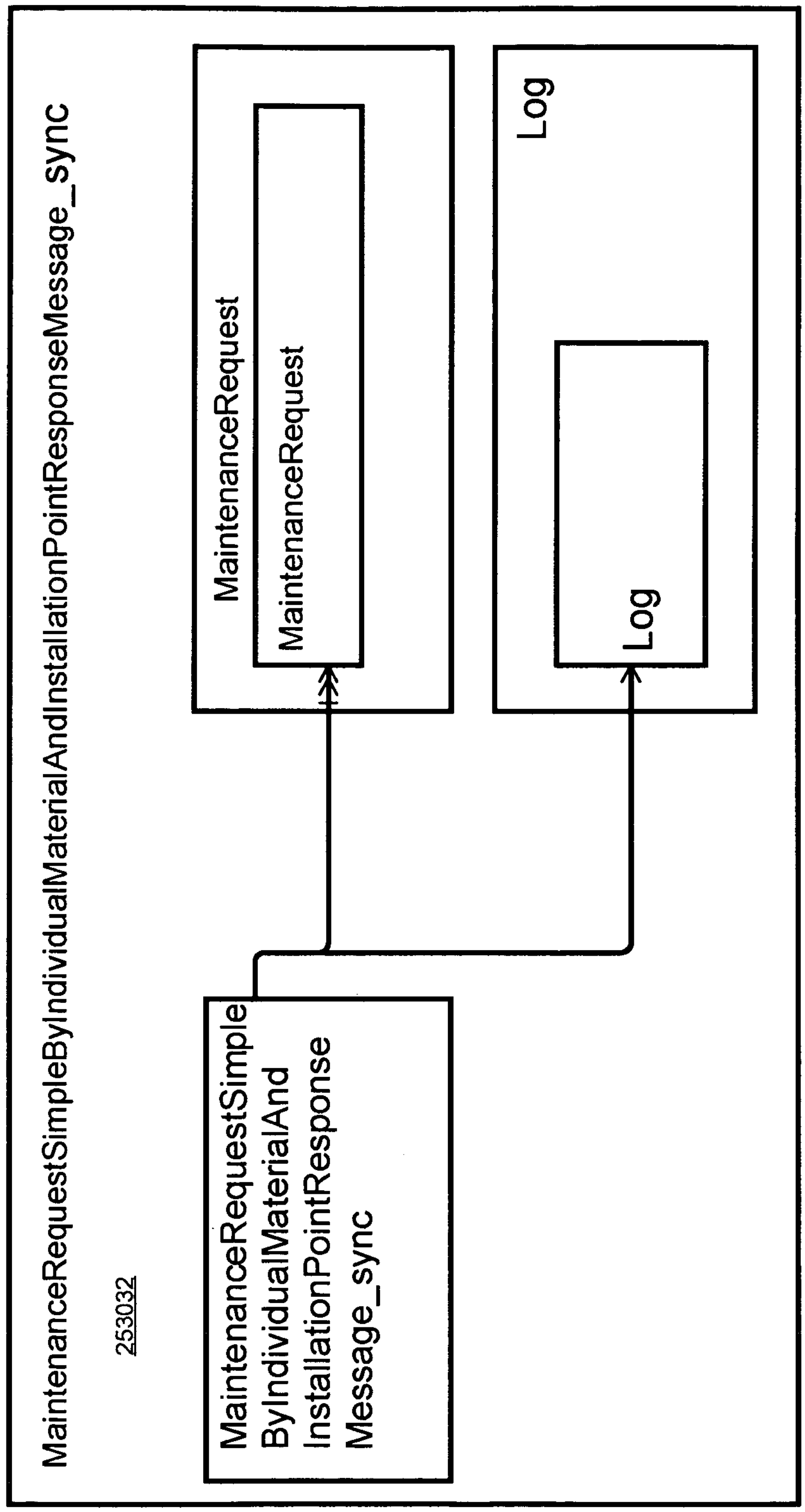
Figure 295:
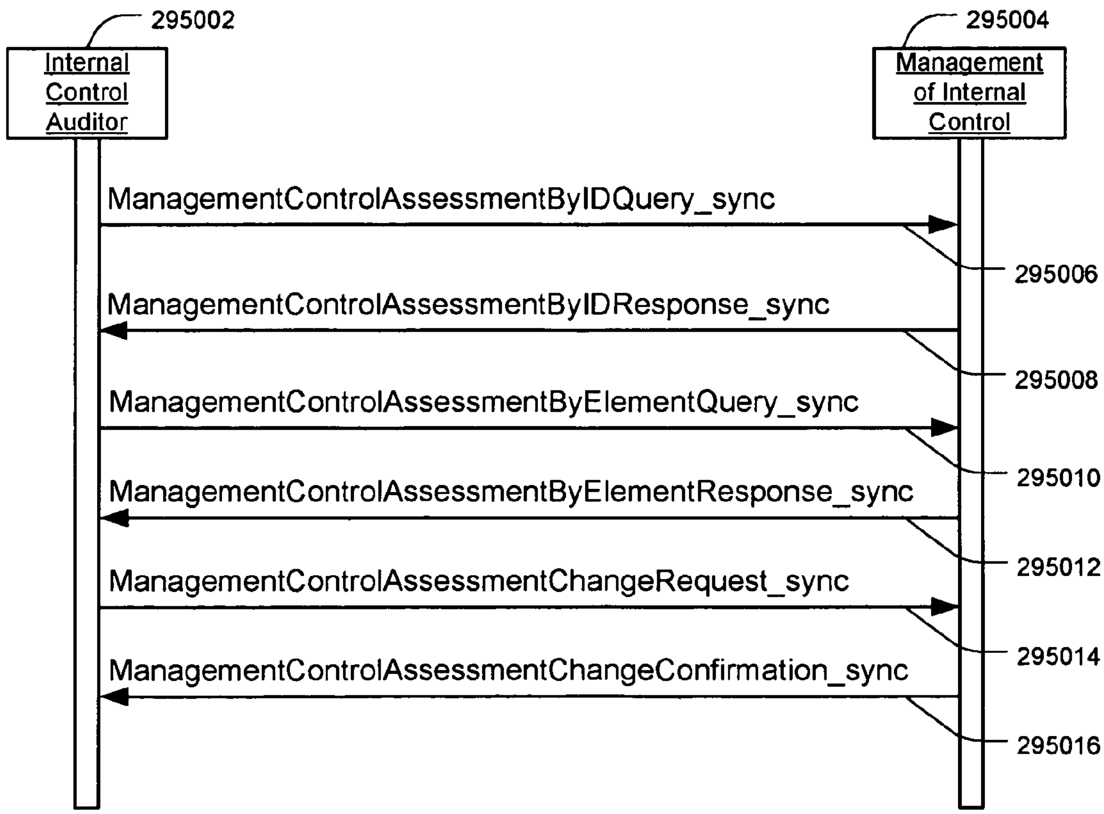
Figure 296:
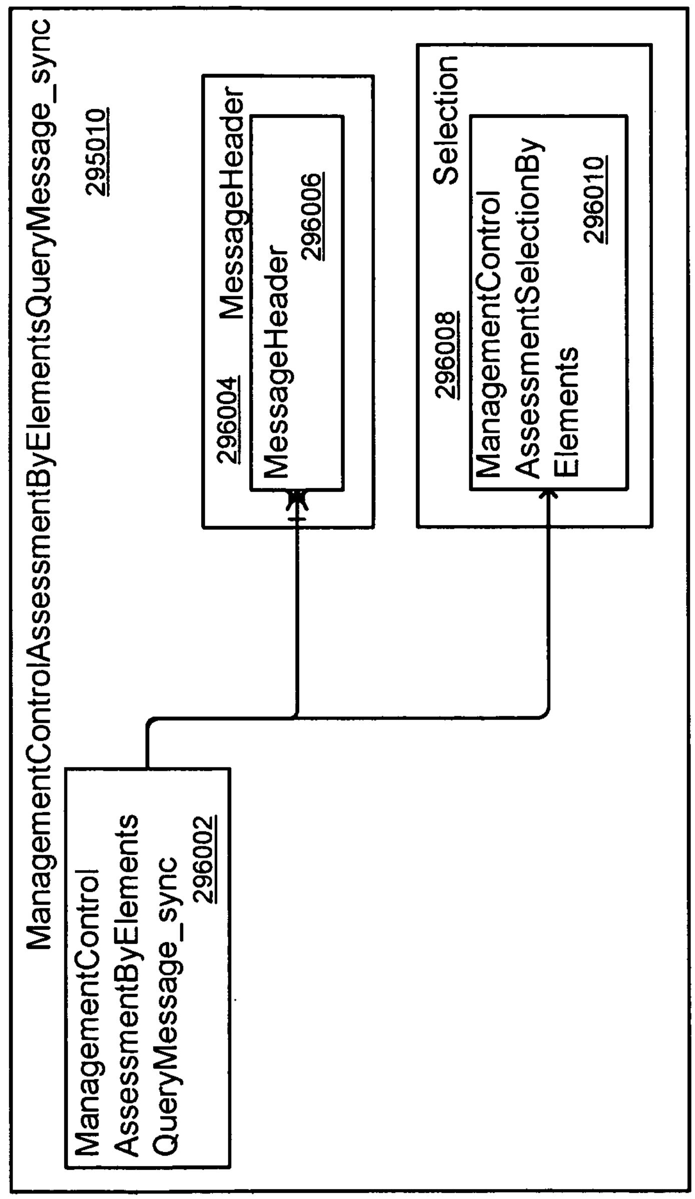
Figure 297:
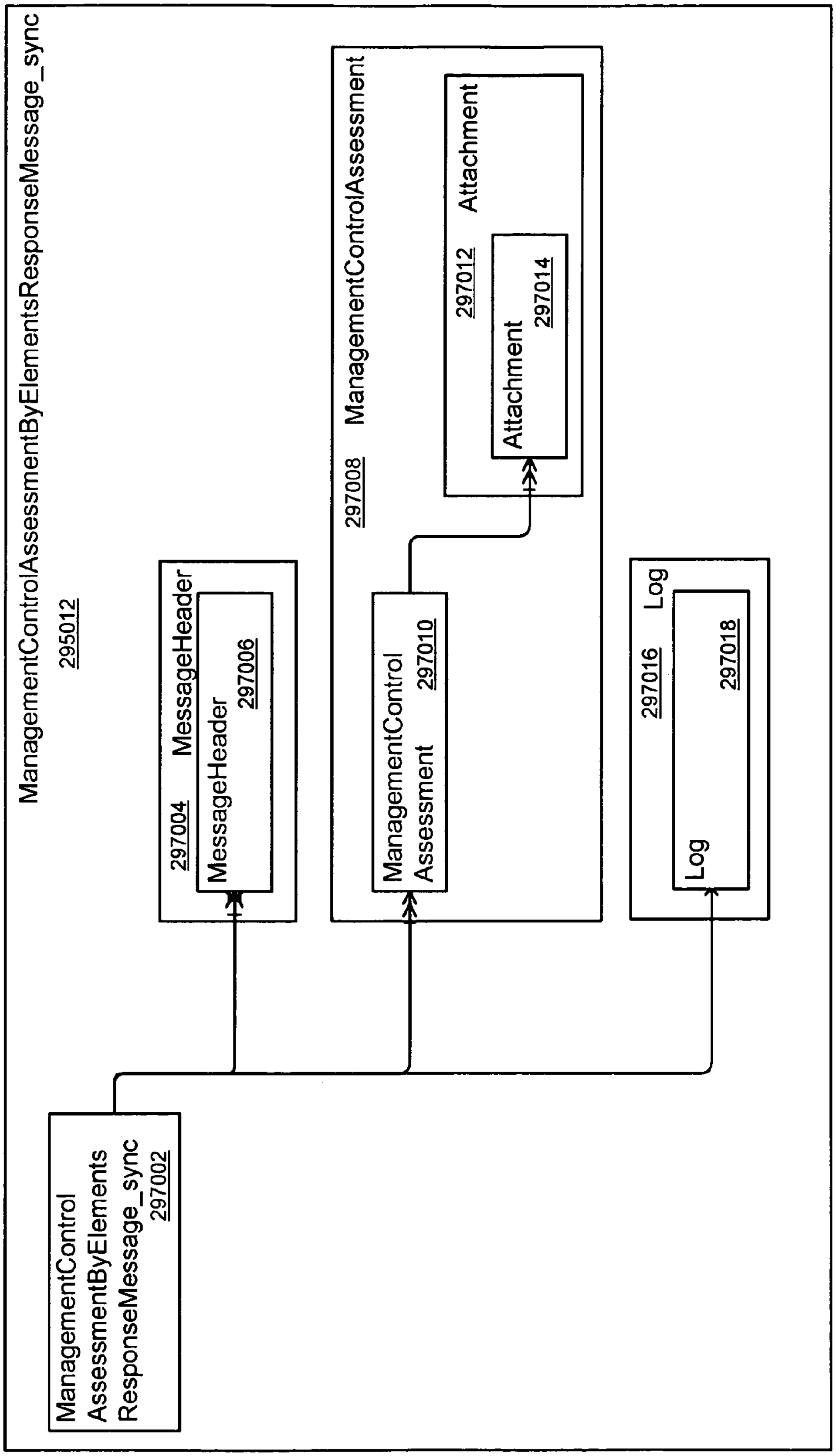
Figure 298:
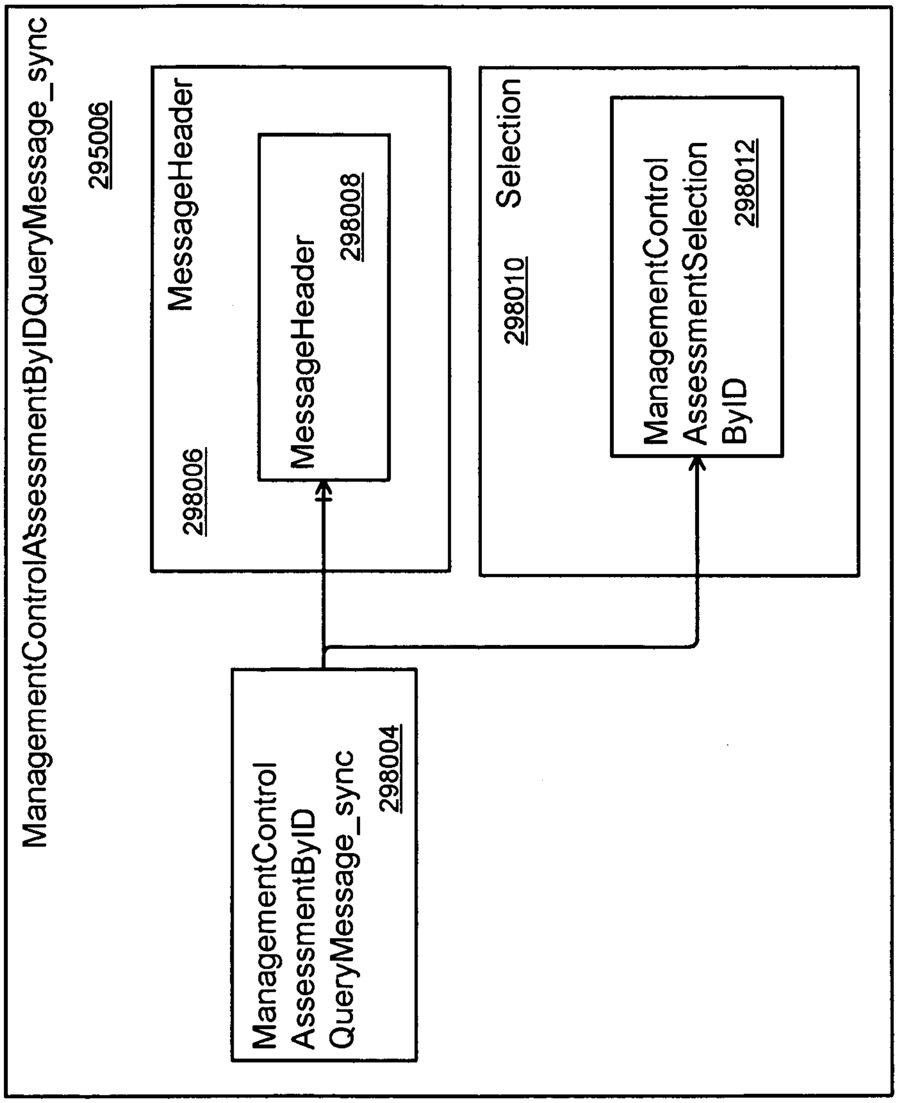
Figure 299:
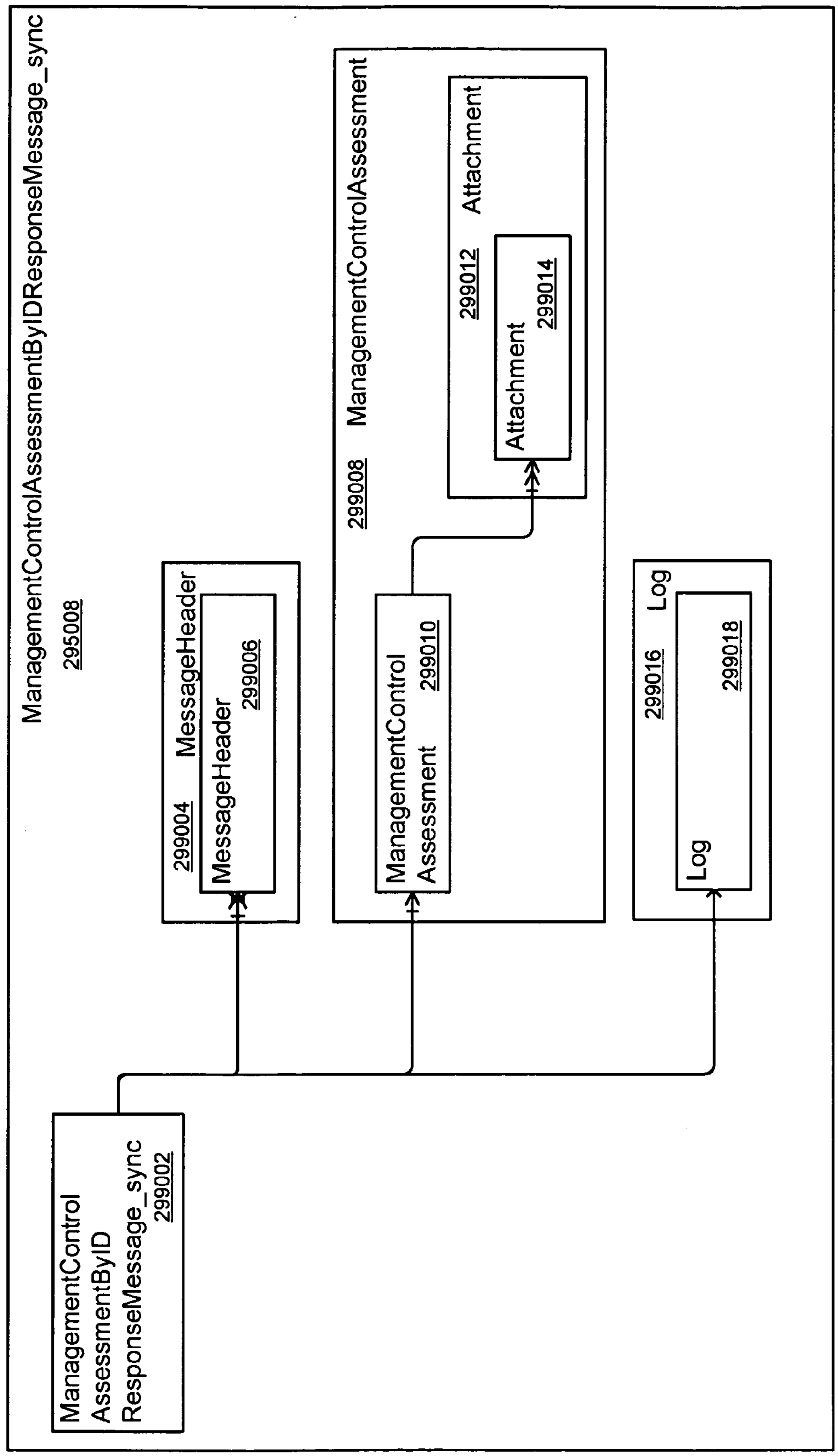
Figure 300:
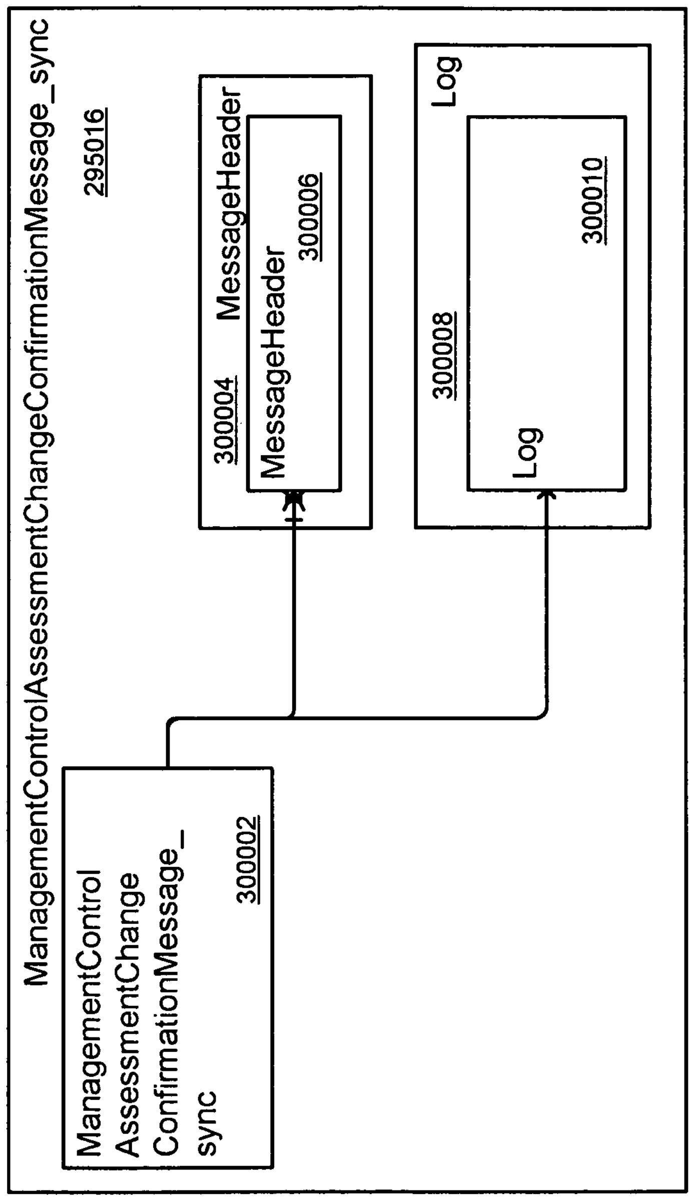
Figure 301:
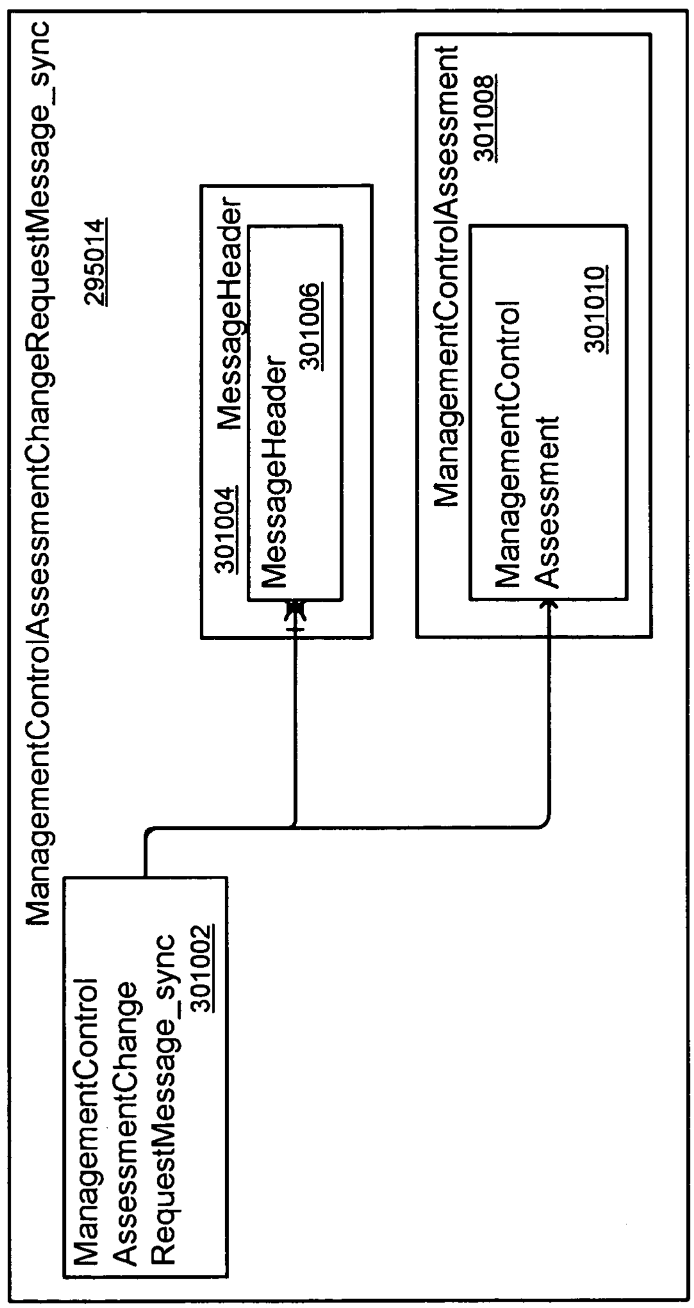
Figure 302:
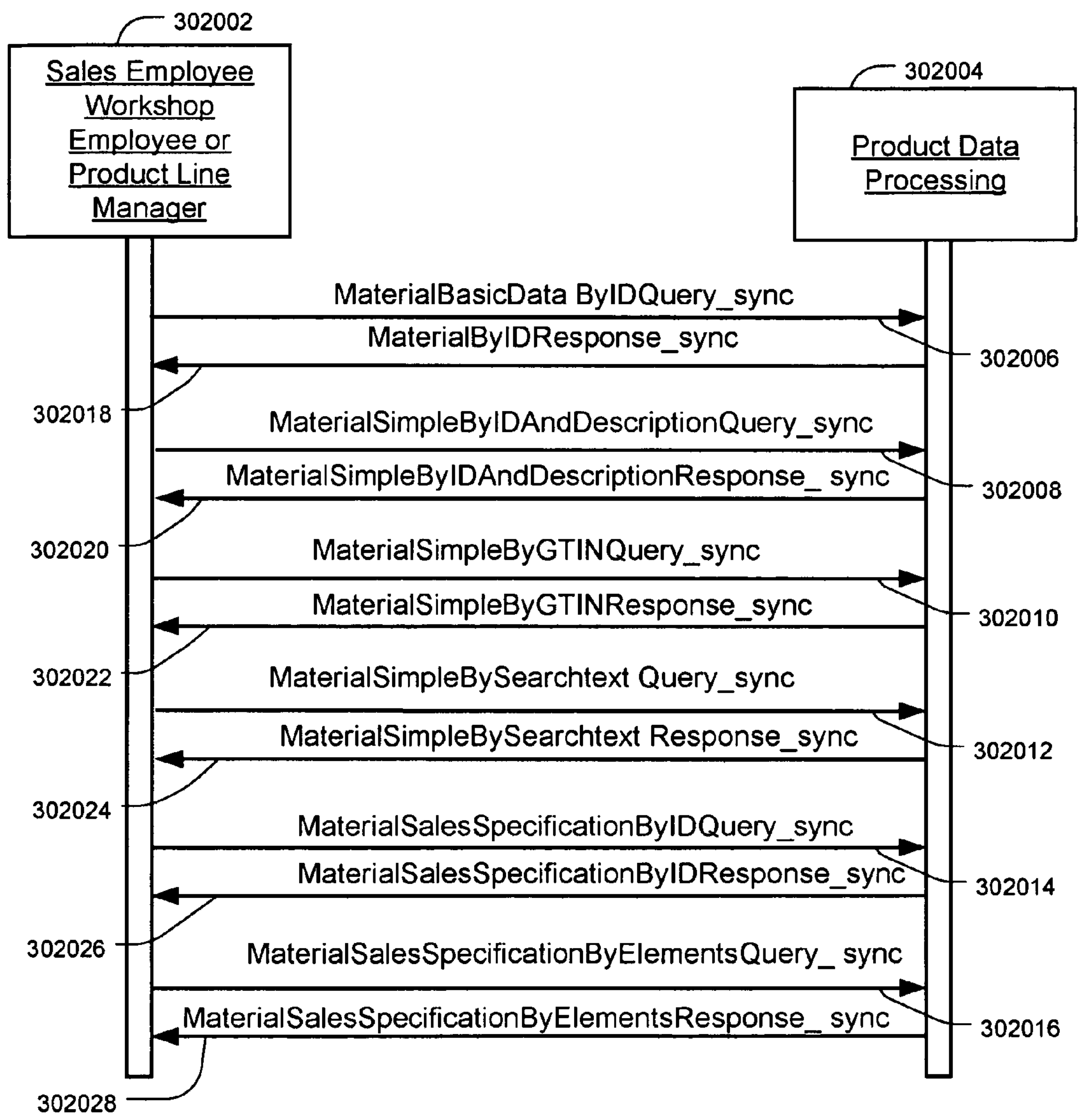
Figure 303:
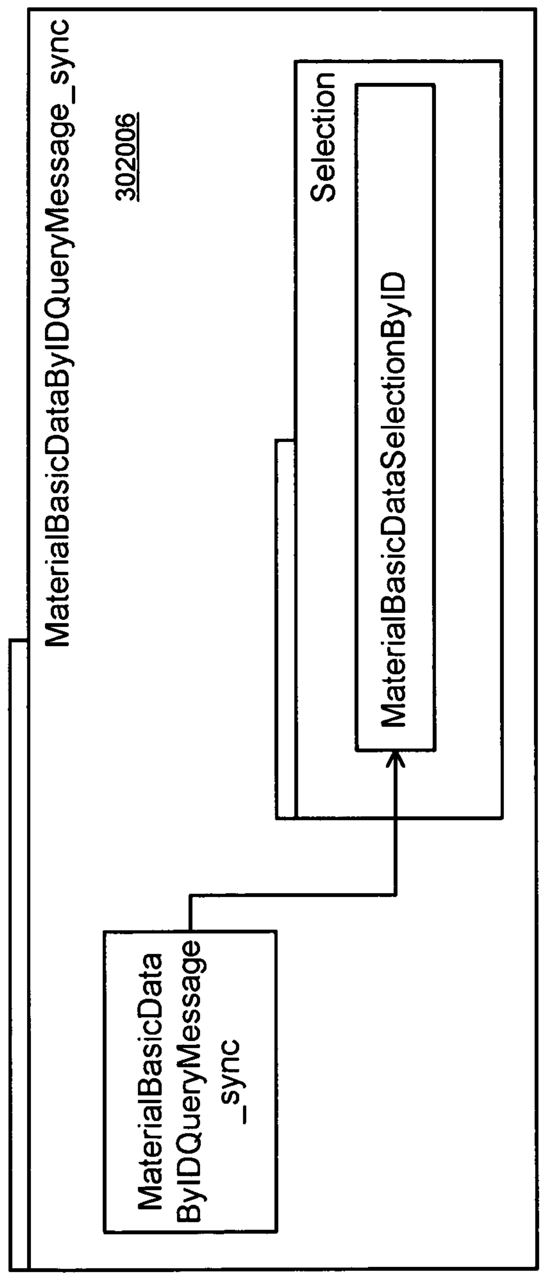
Figure 304:
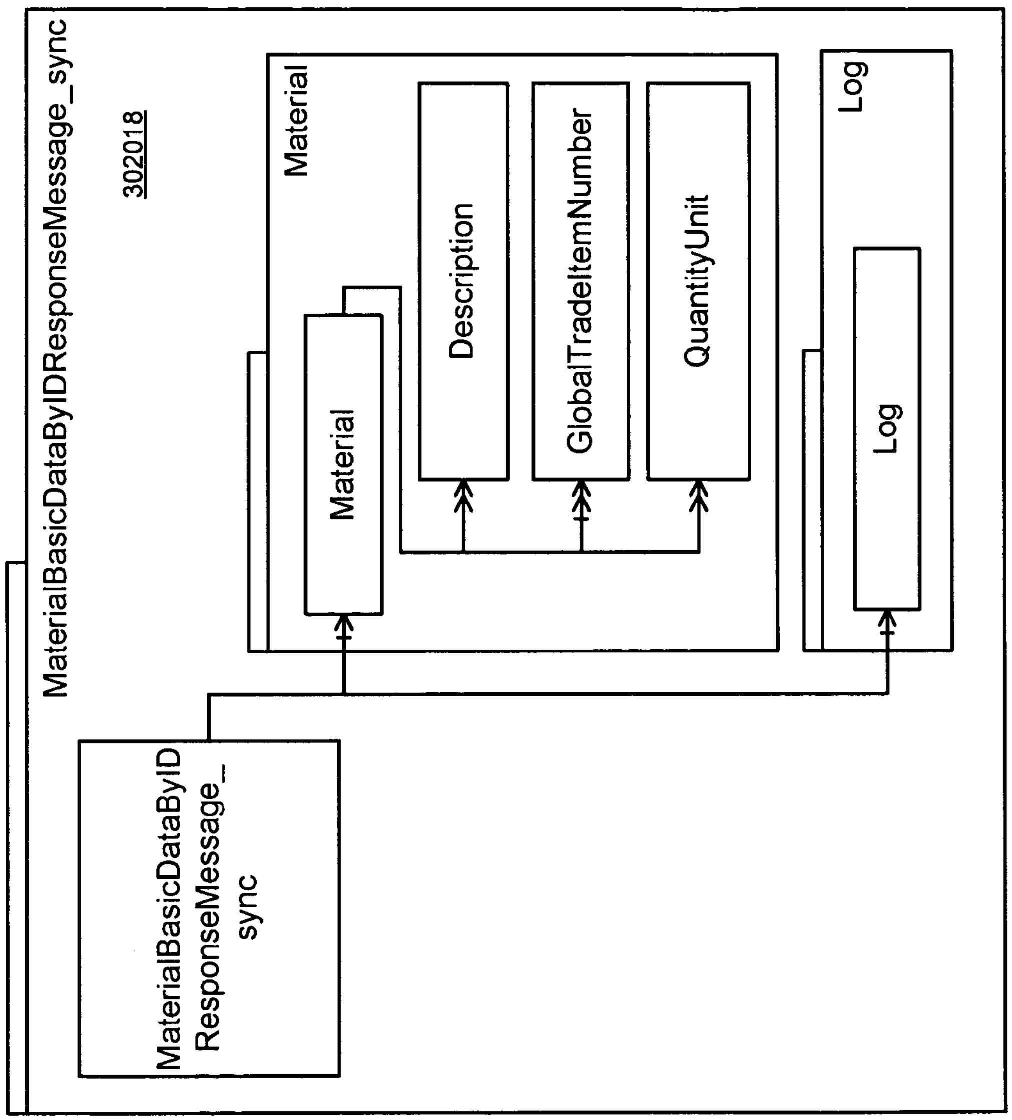
Figure 305:
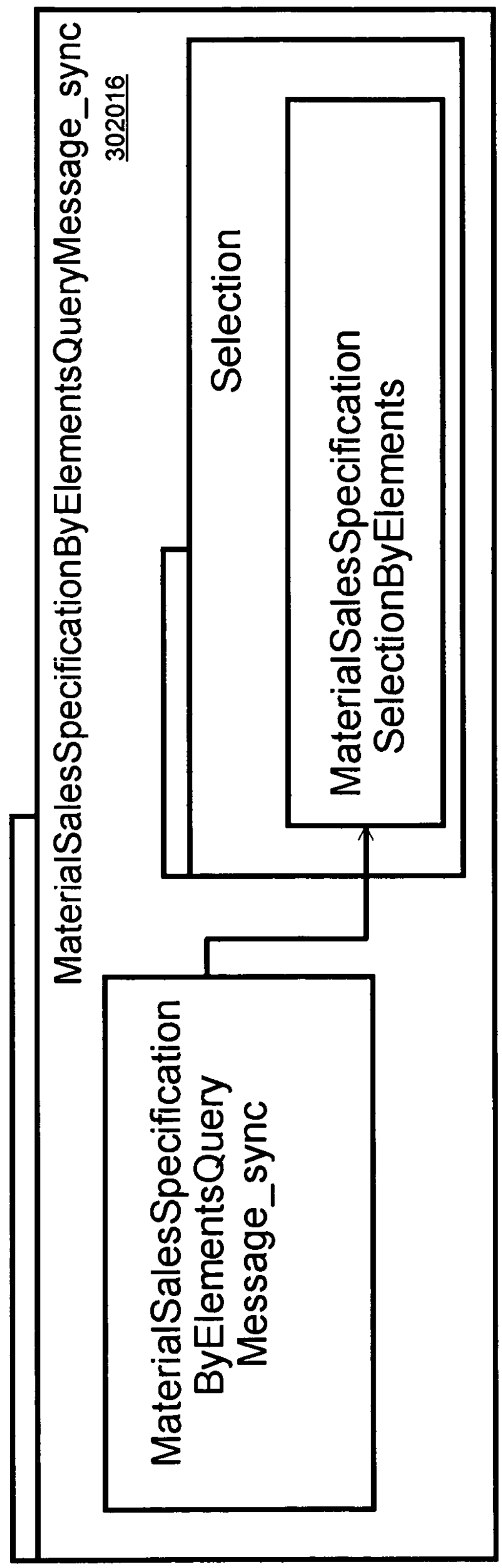
Figure 306:
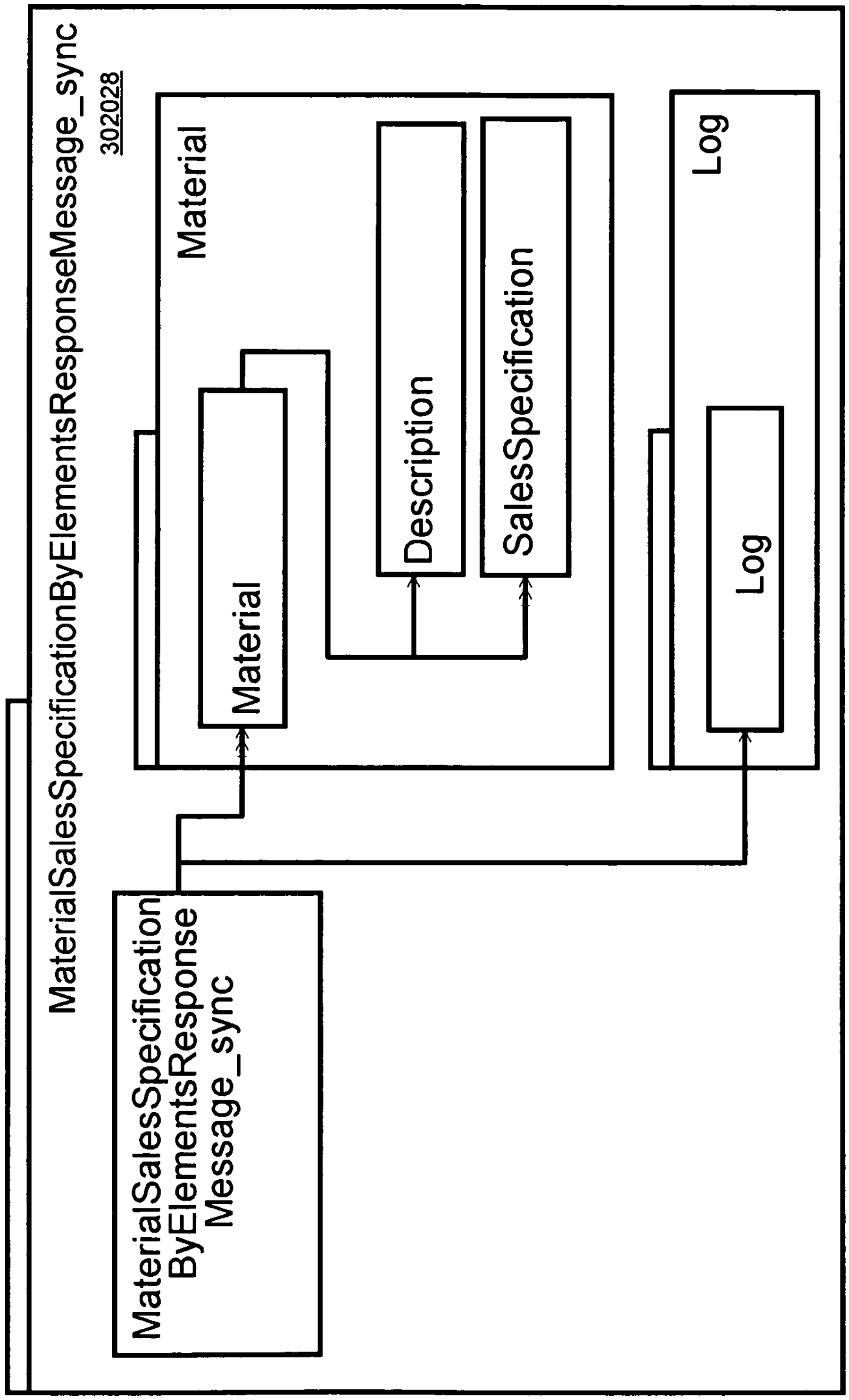
Figure 307:
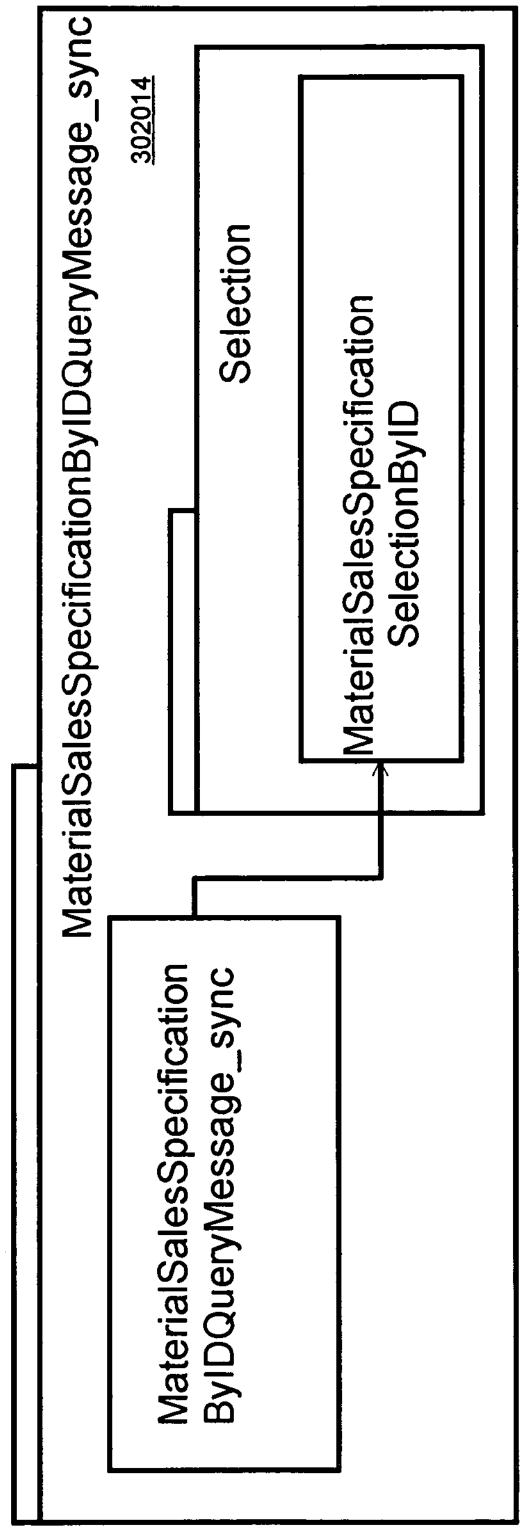
Figure 308:
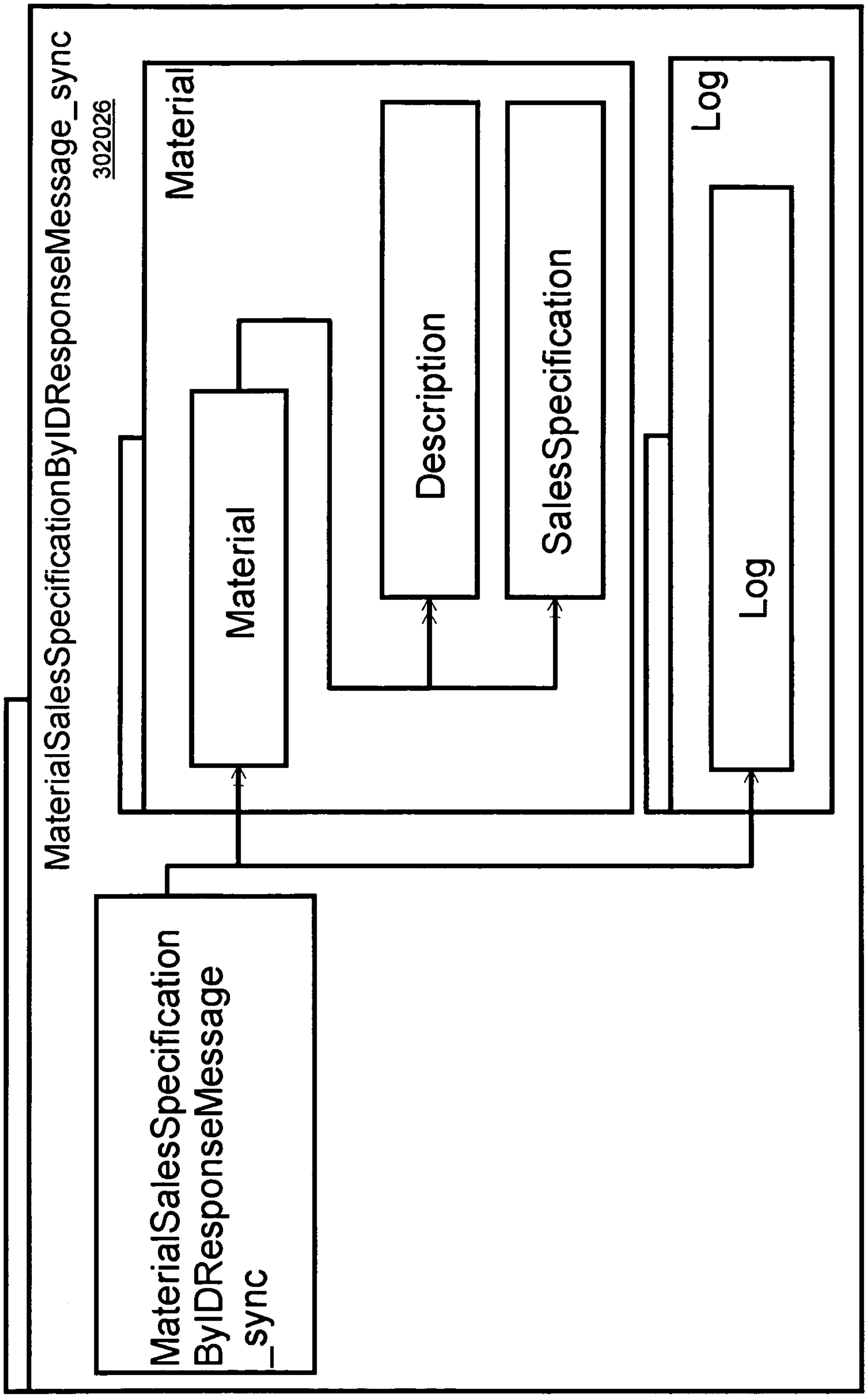
Figure 309:
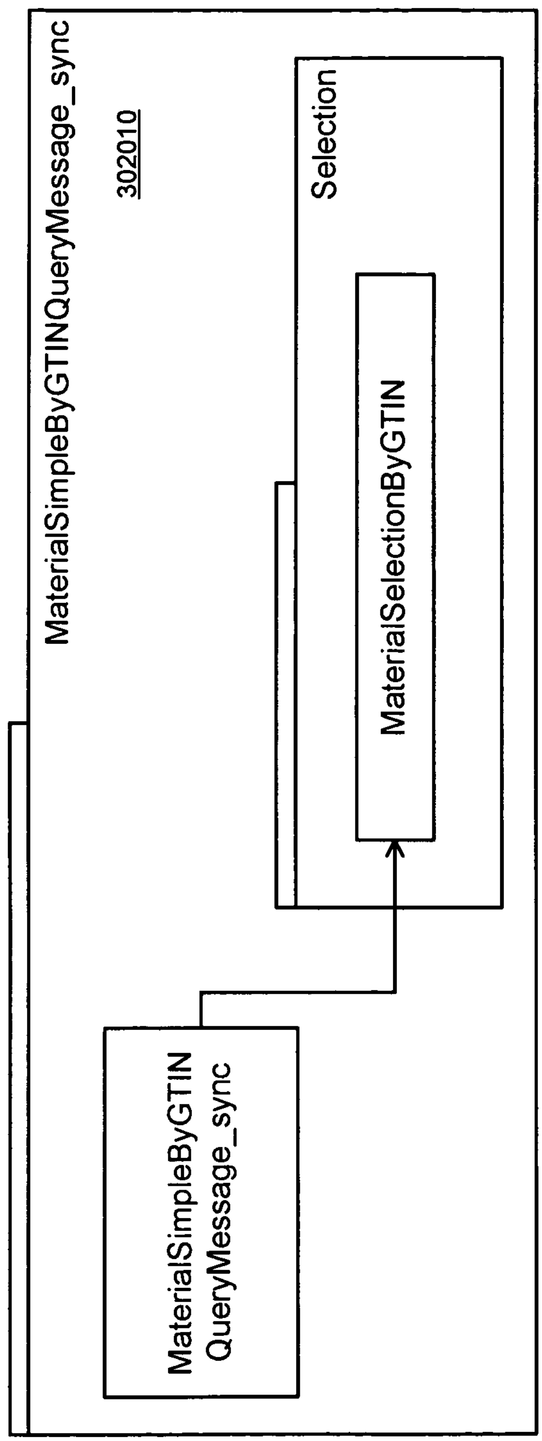
Figure 310:
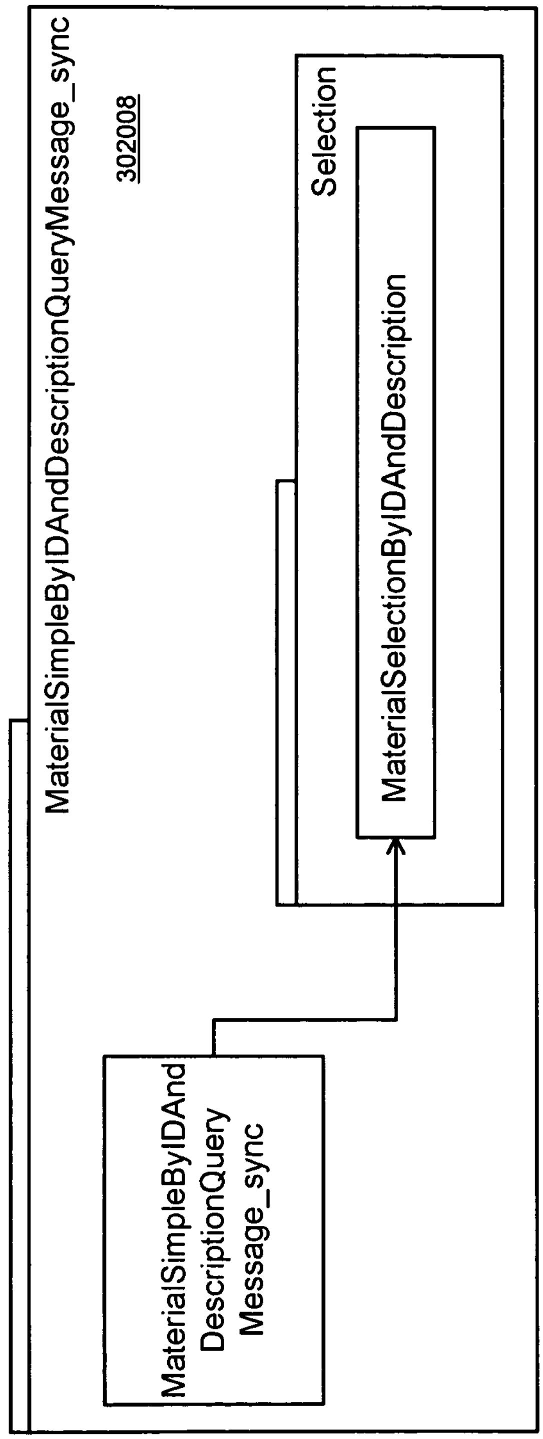
Figure 311:
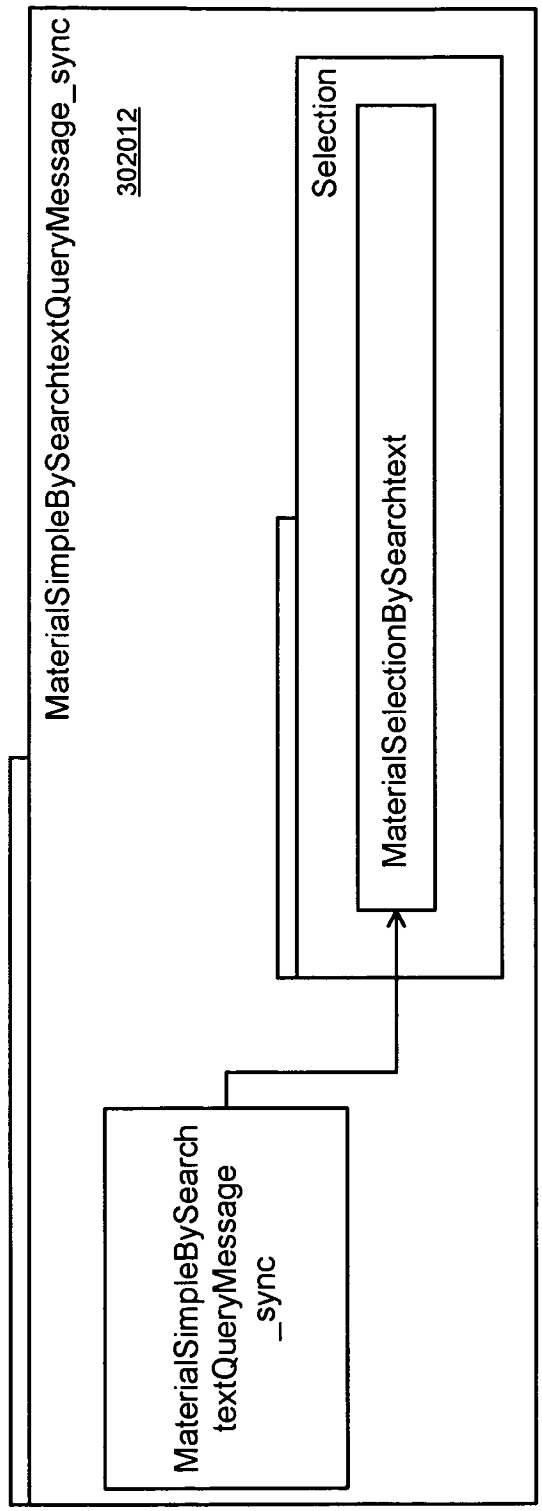
Figure 312:
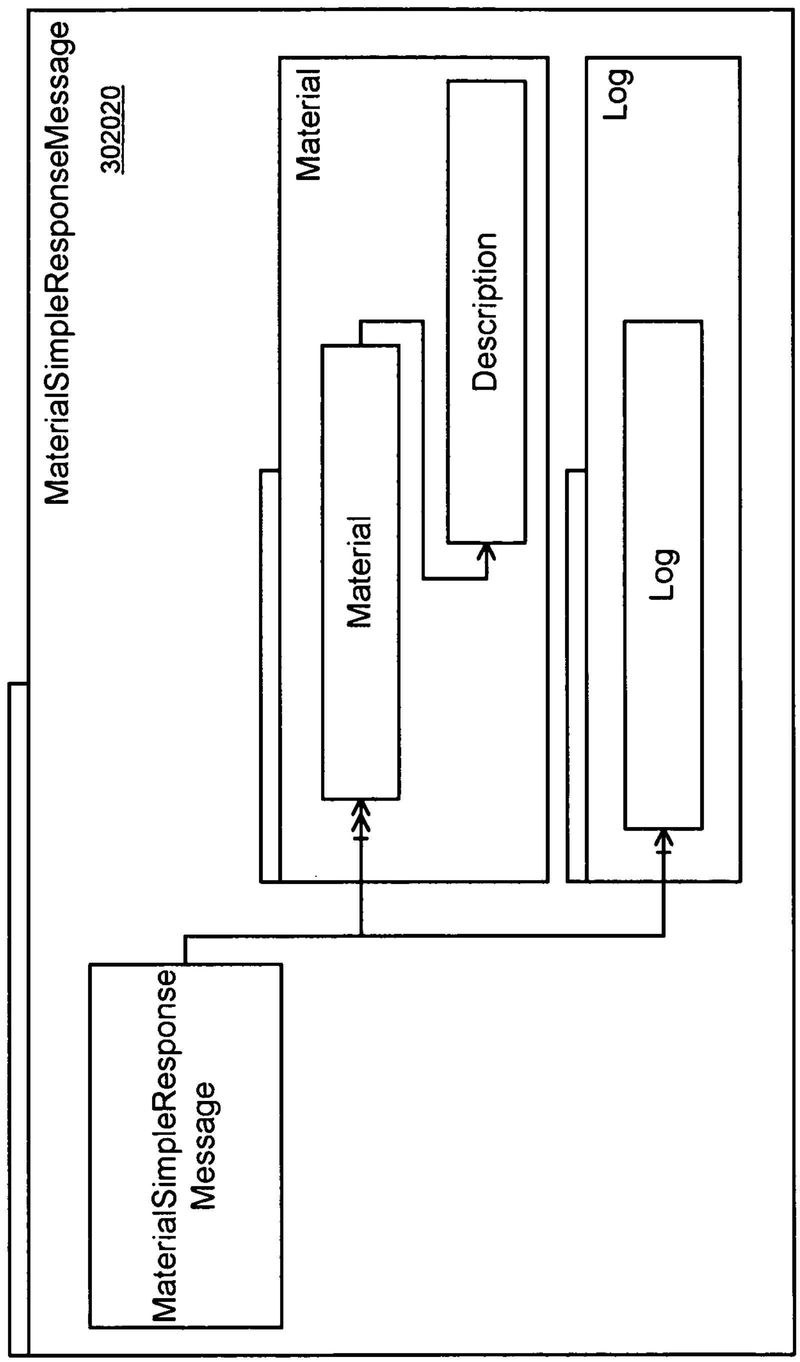
Figure 326:
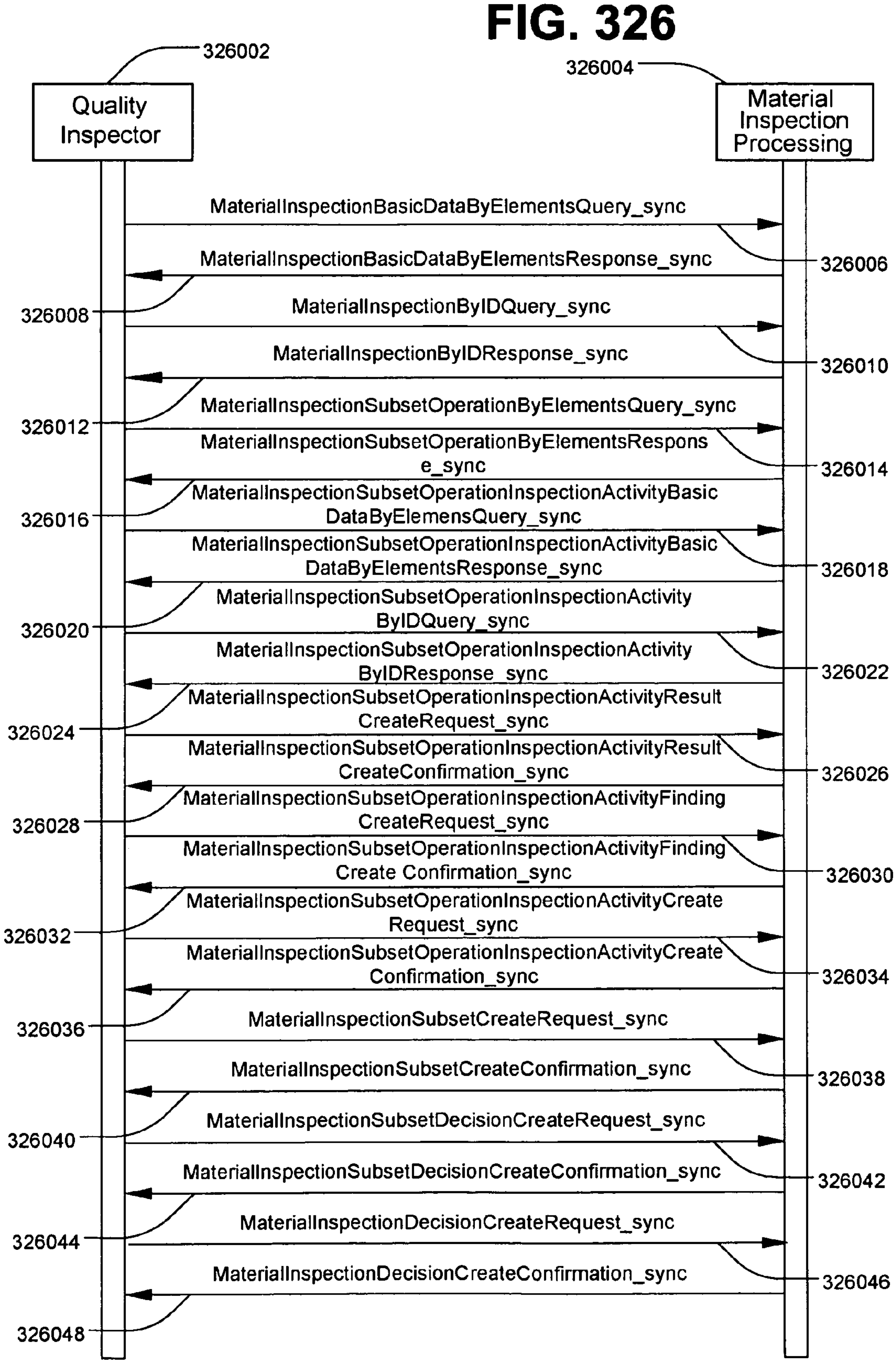
Figure 327:
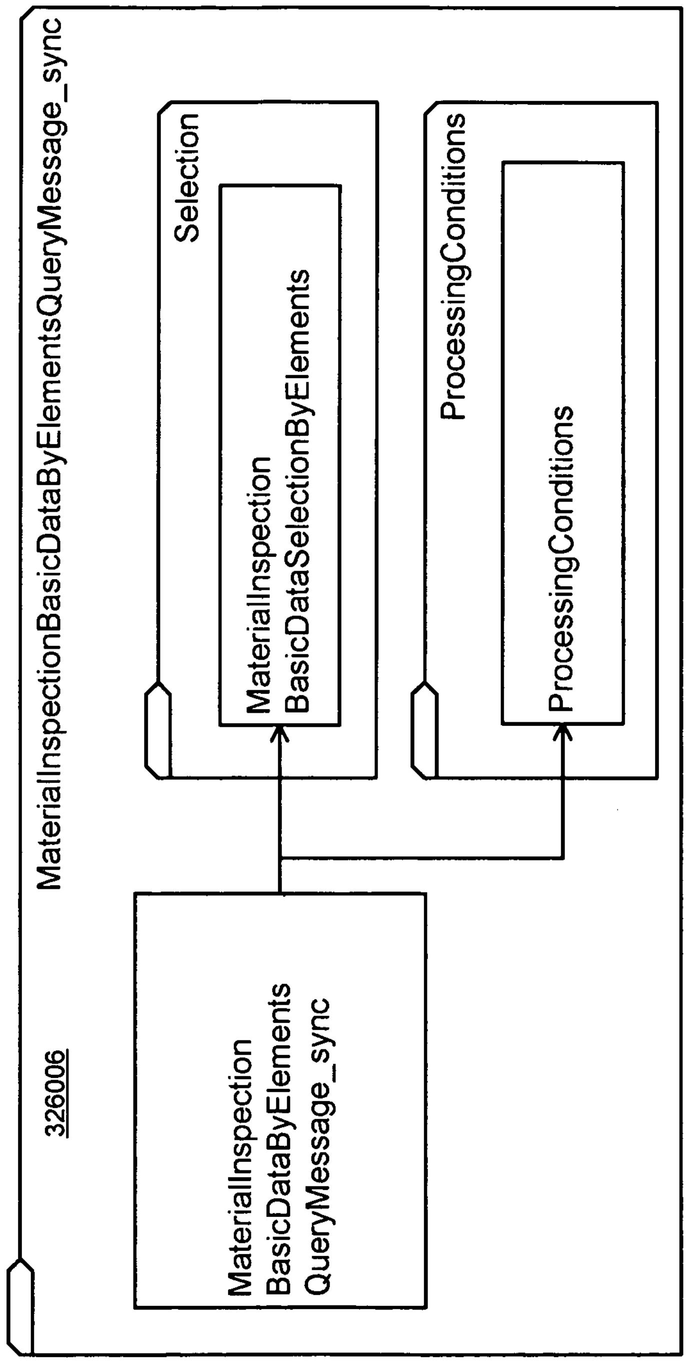
Figure 328:
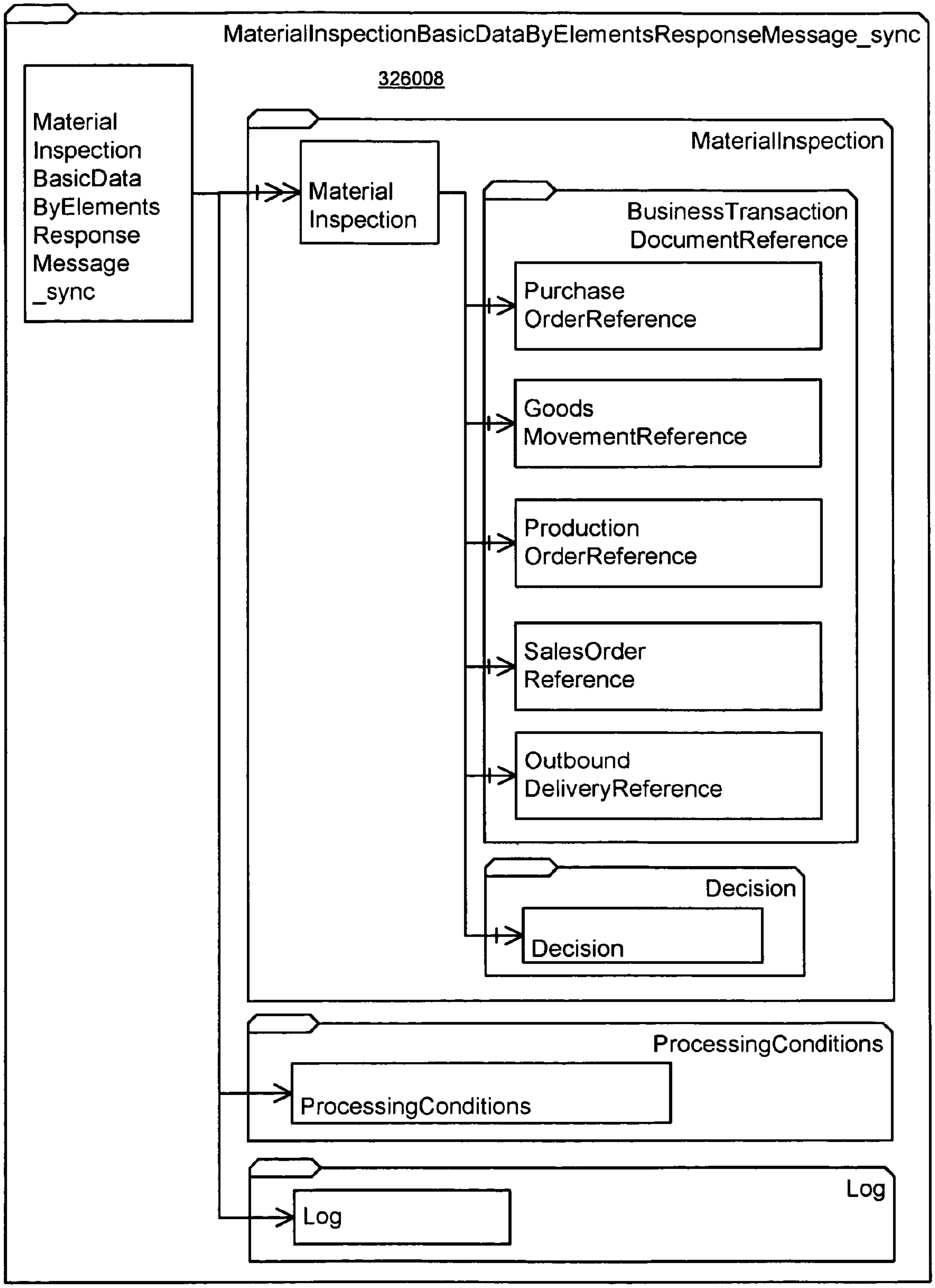
Figure 329:
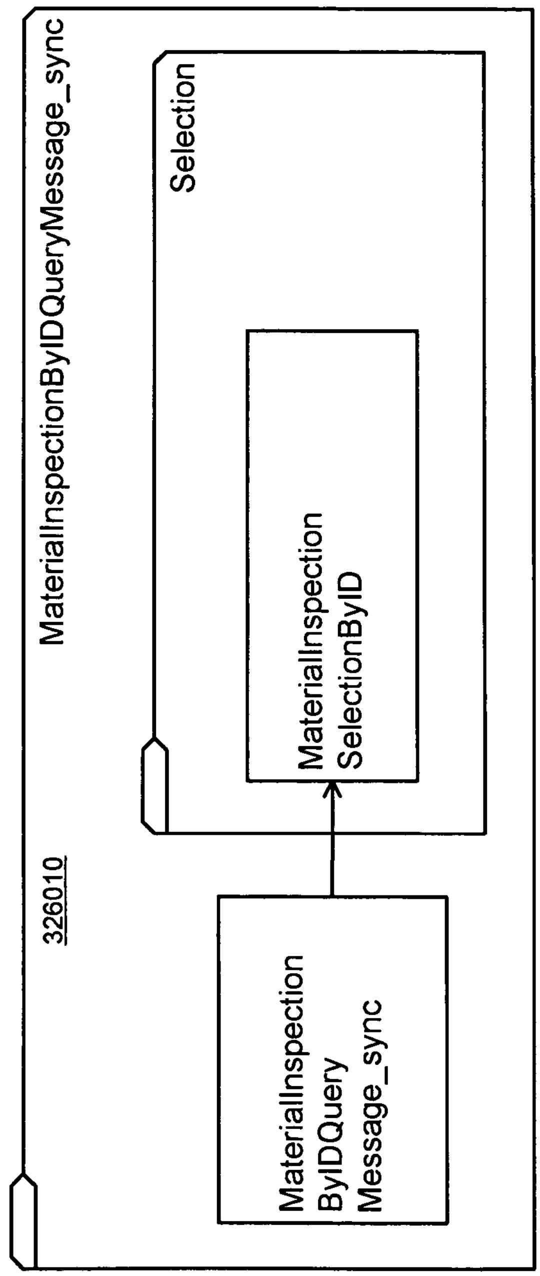
Figure 330:
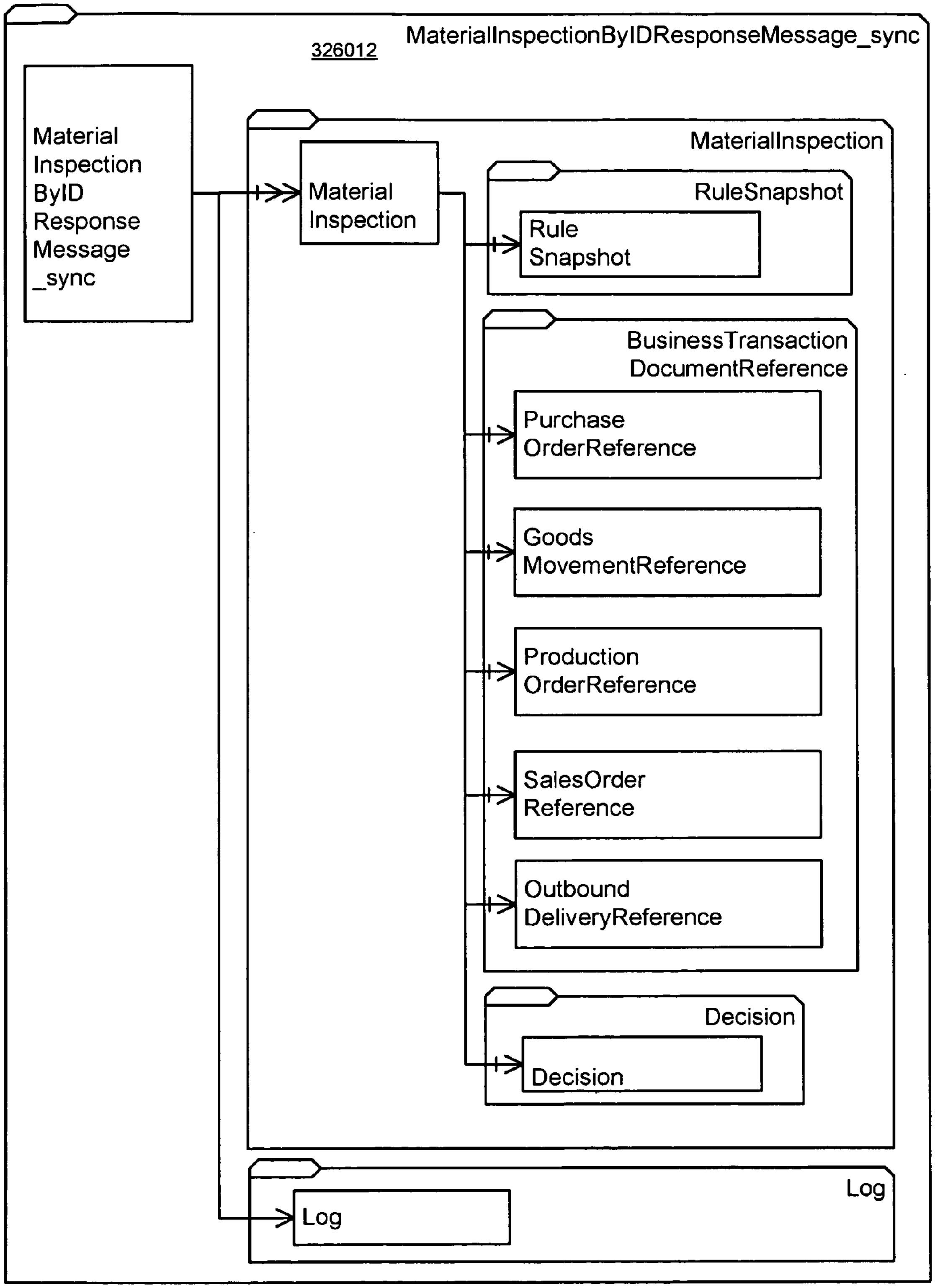
Figure 331:
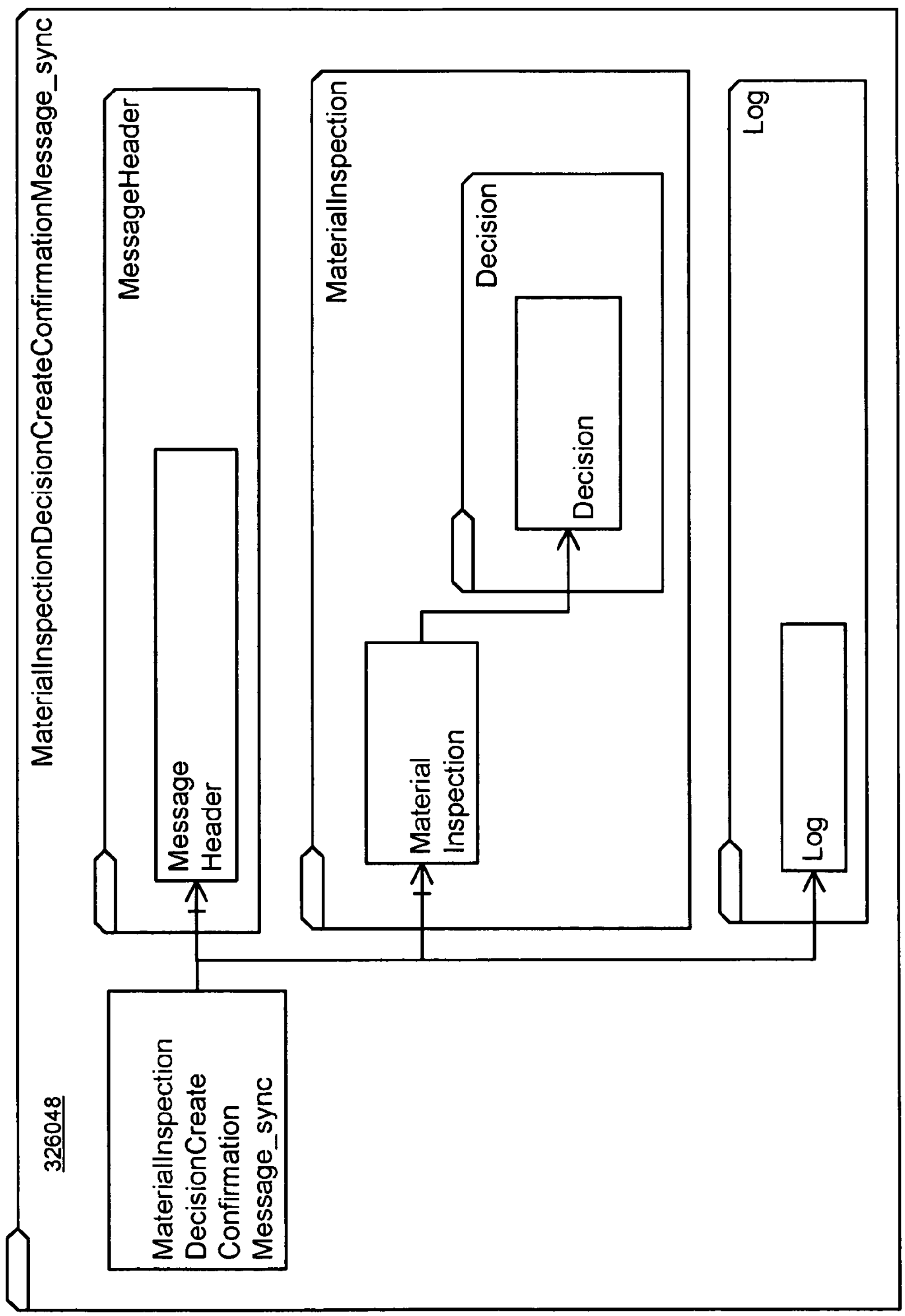
Figure 332:
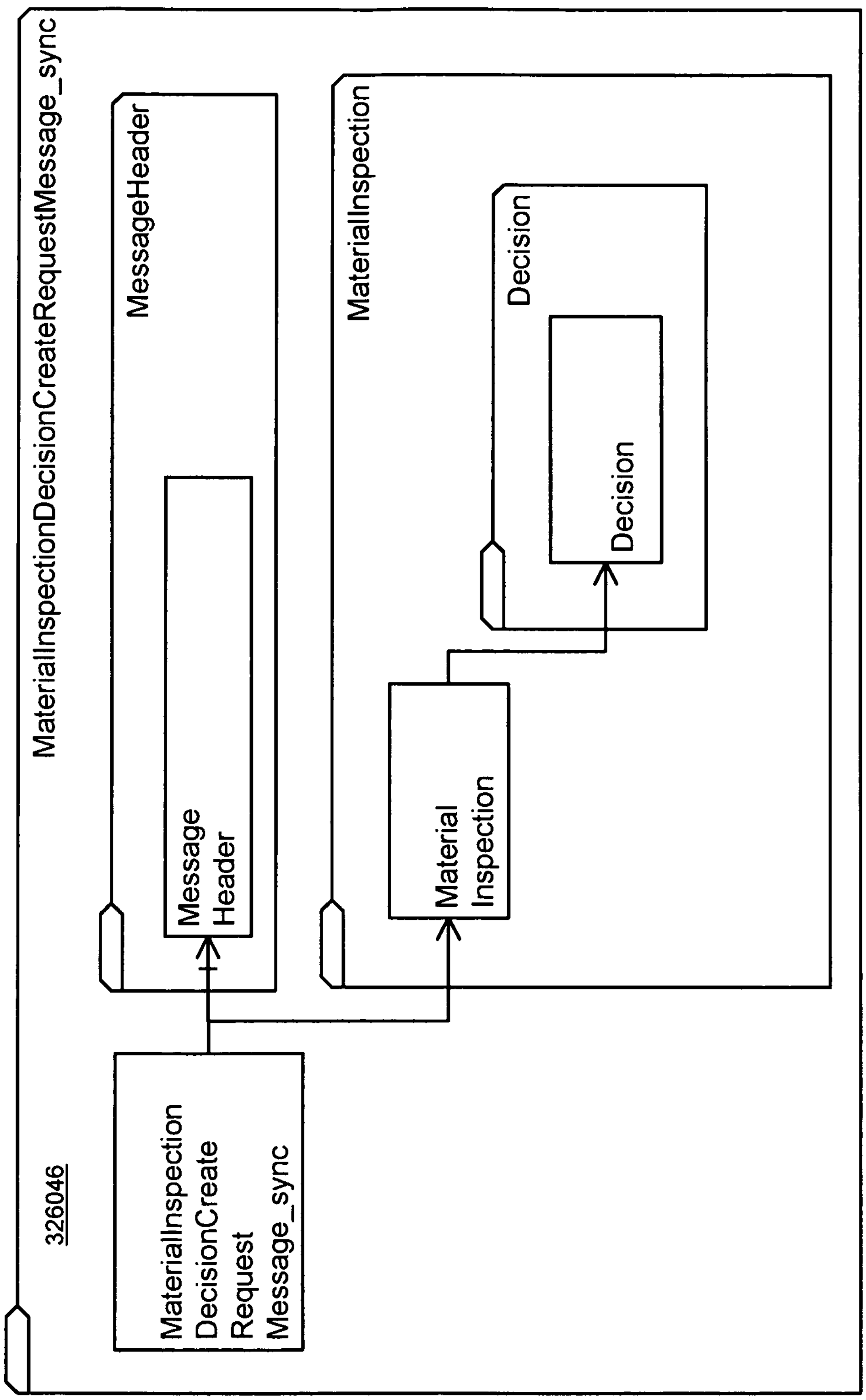
Figure 333:
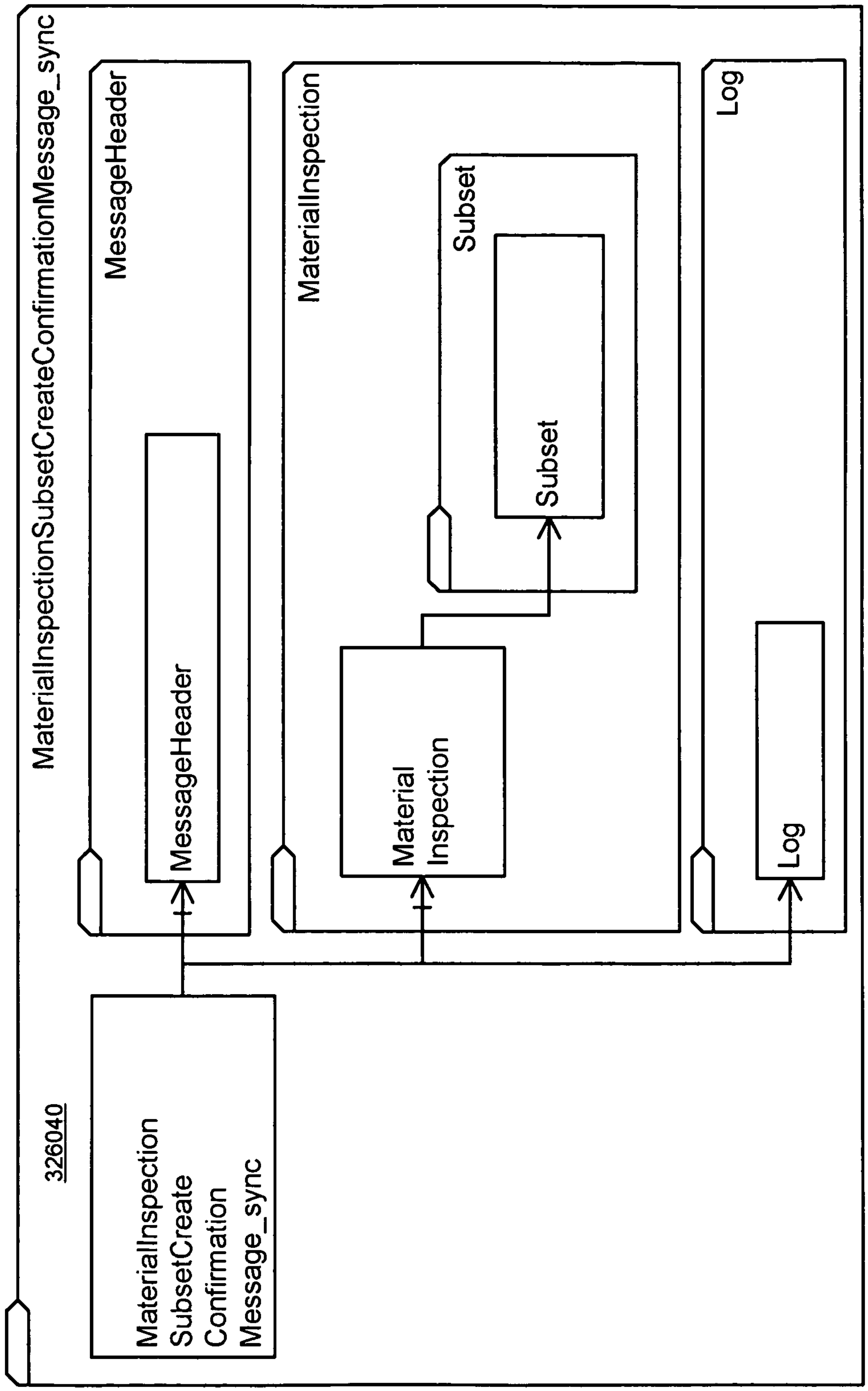
Figure 334:
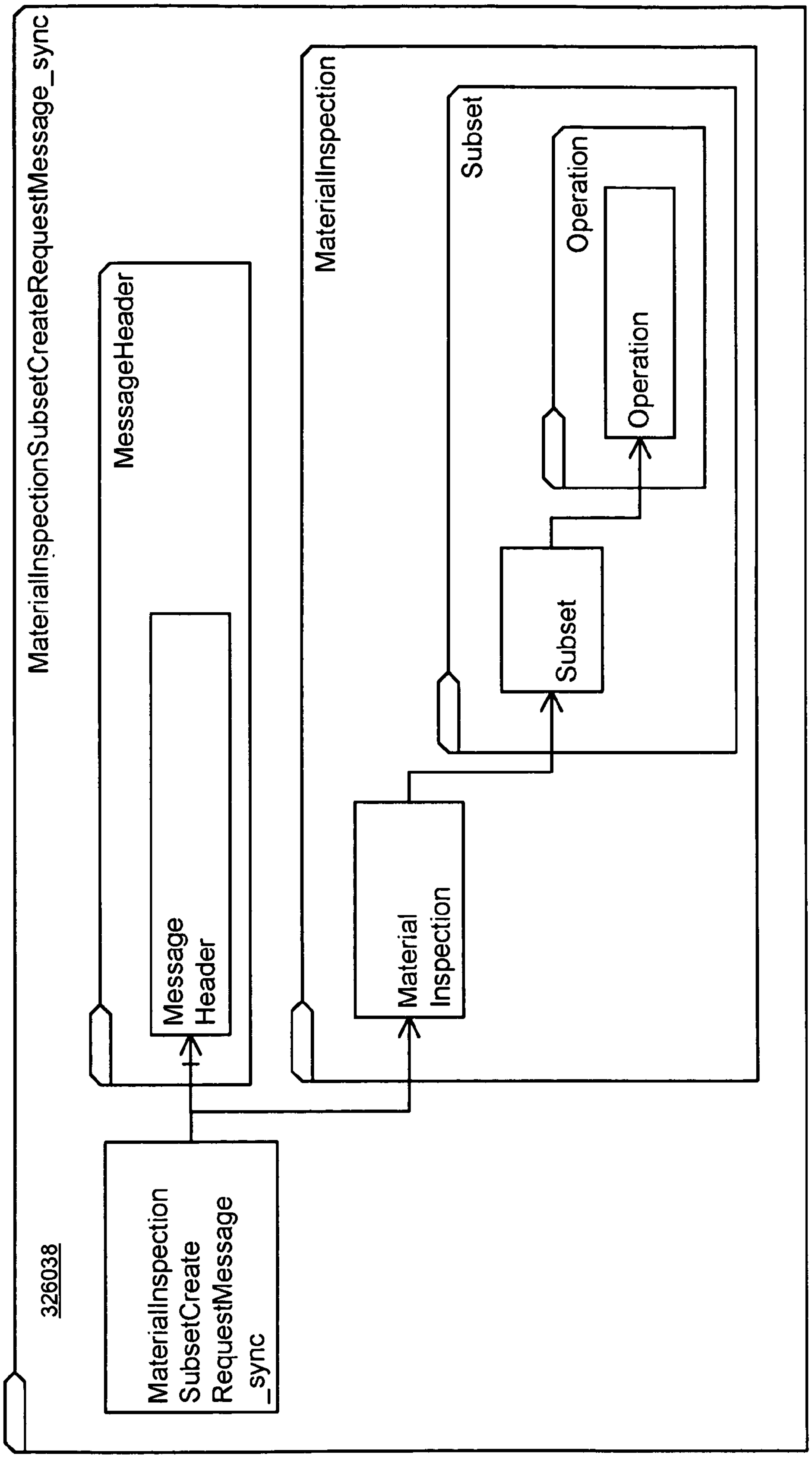
Figure 335:
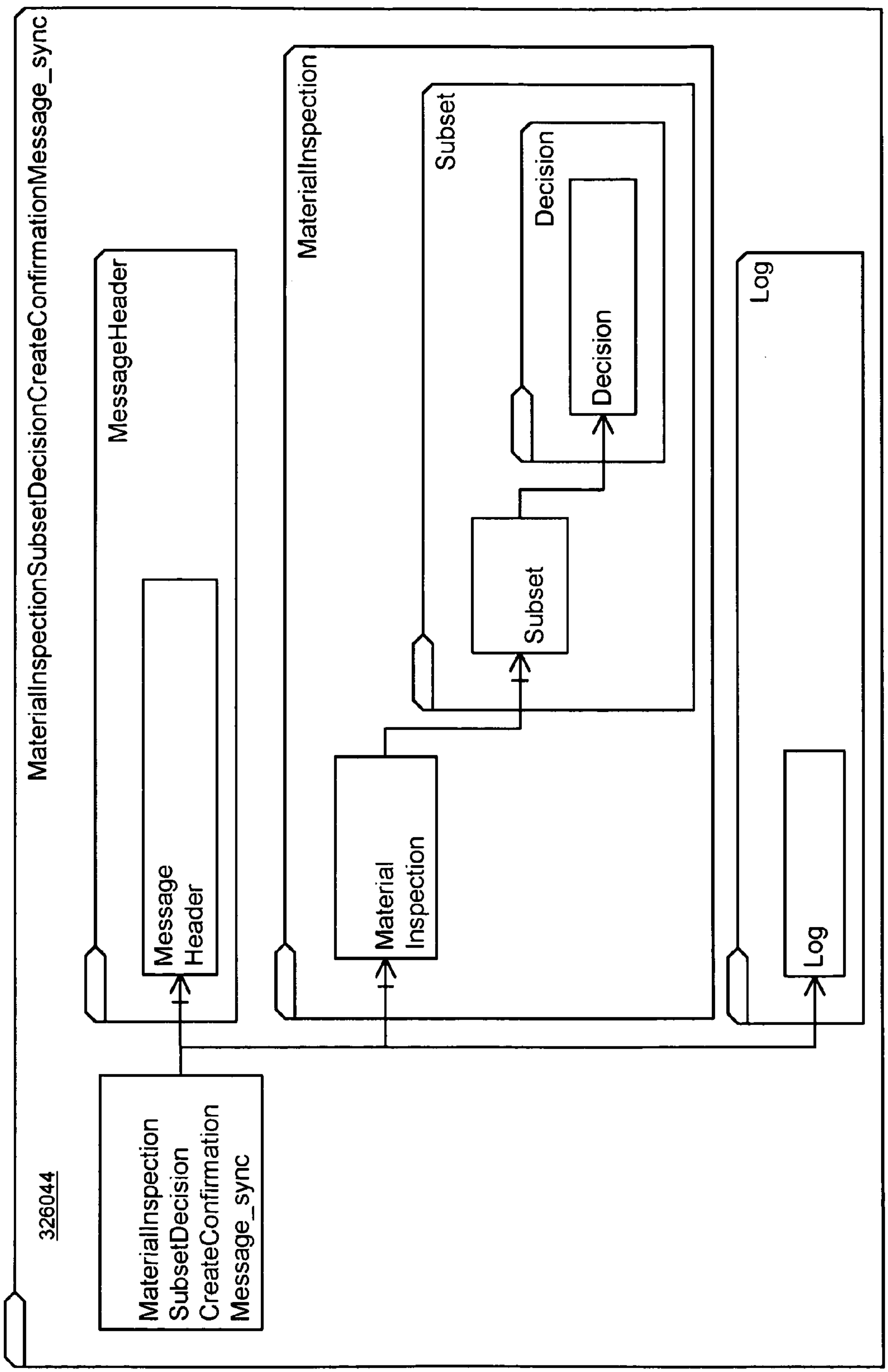
Figure 336:
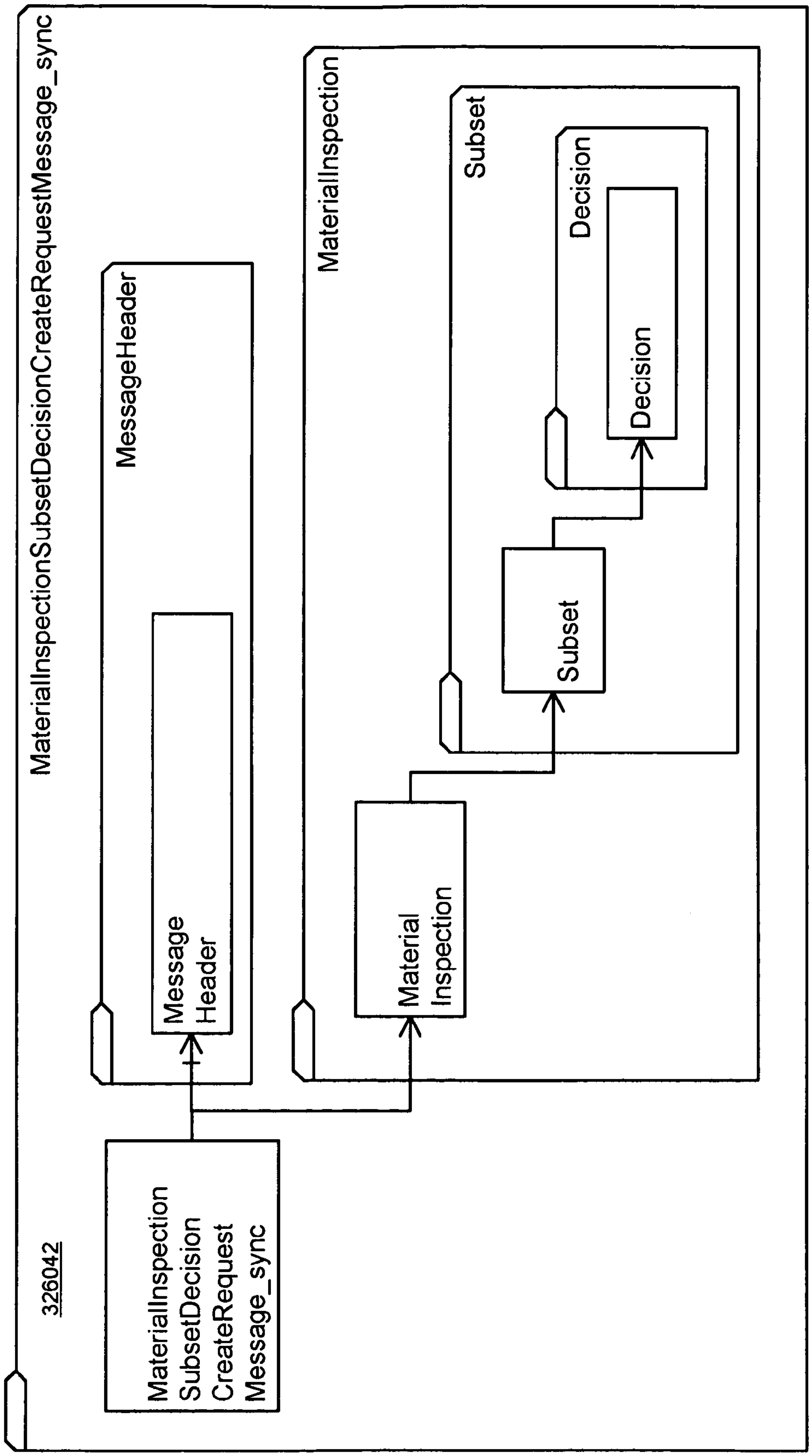
Figure 337:
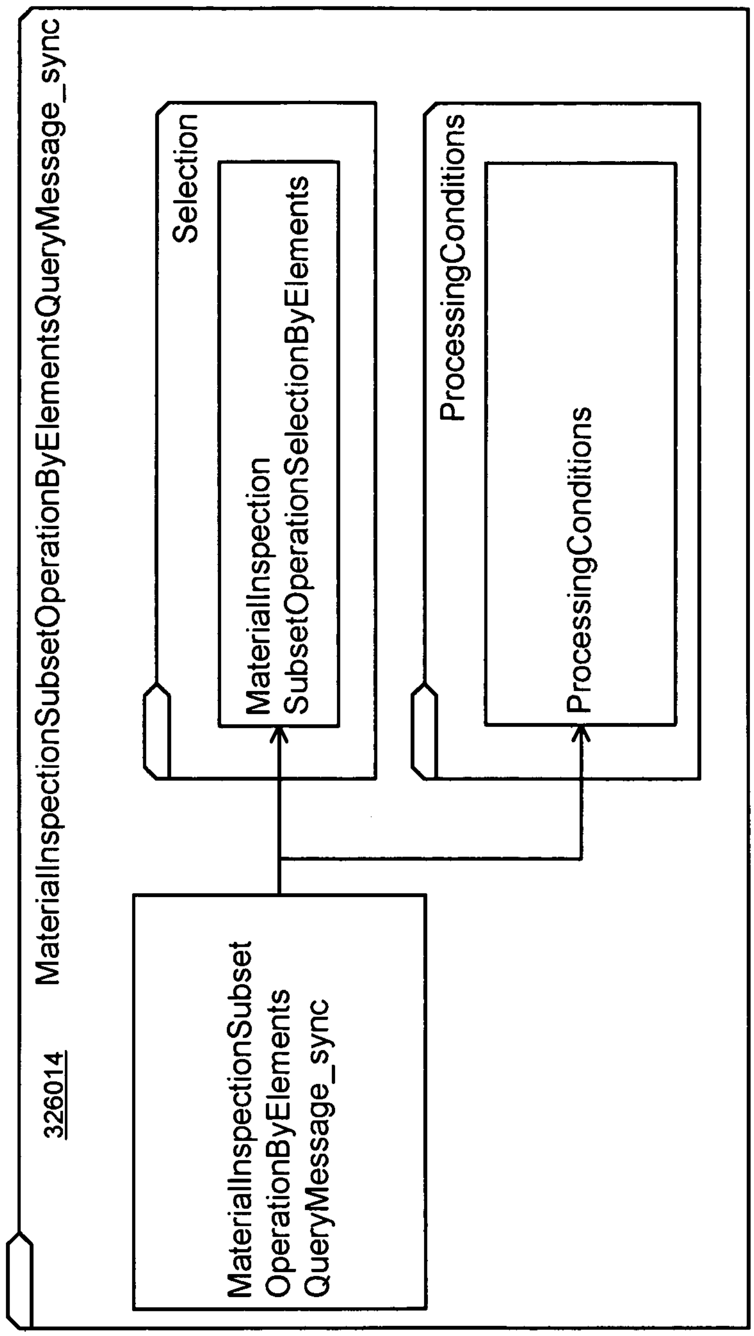
Figure 338:
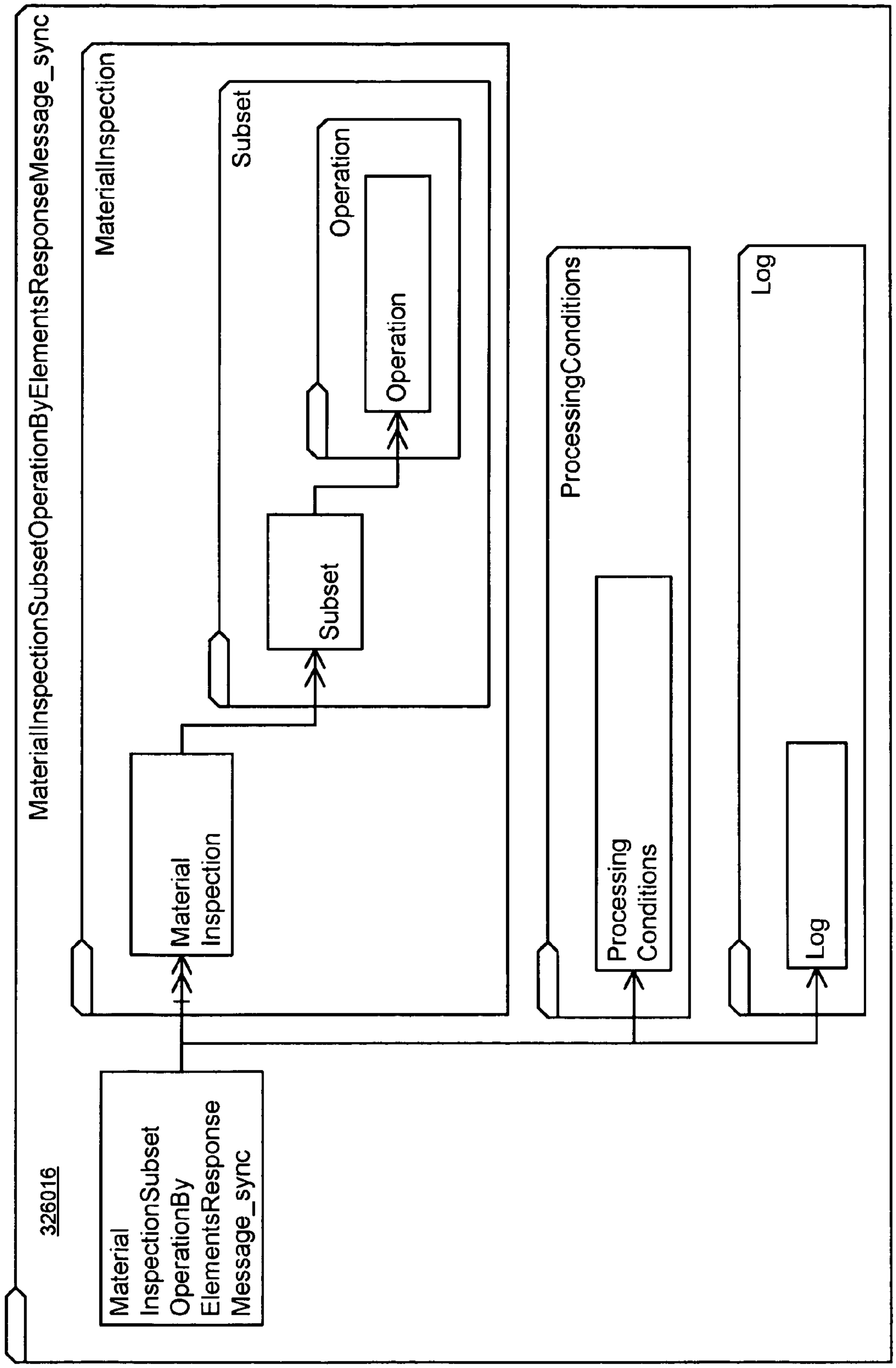
Figure 339:
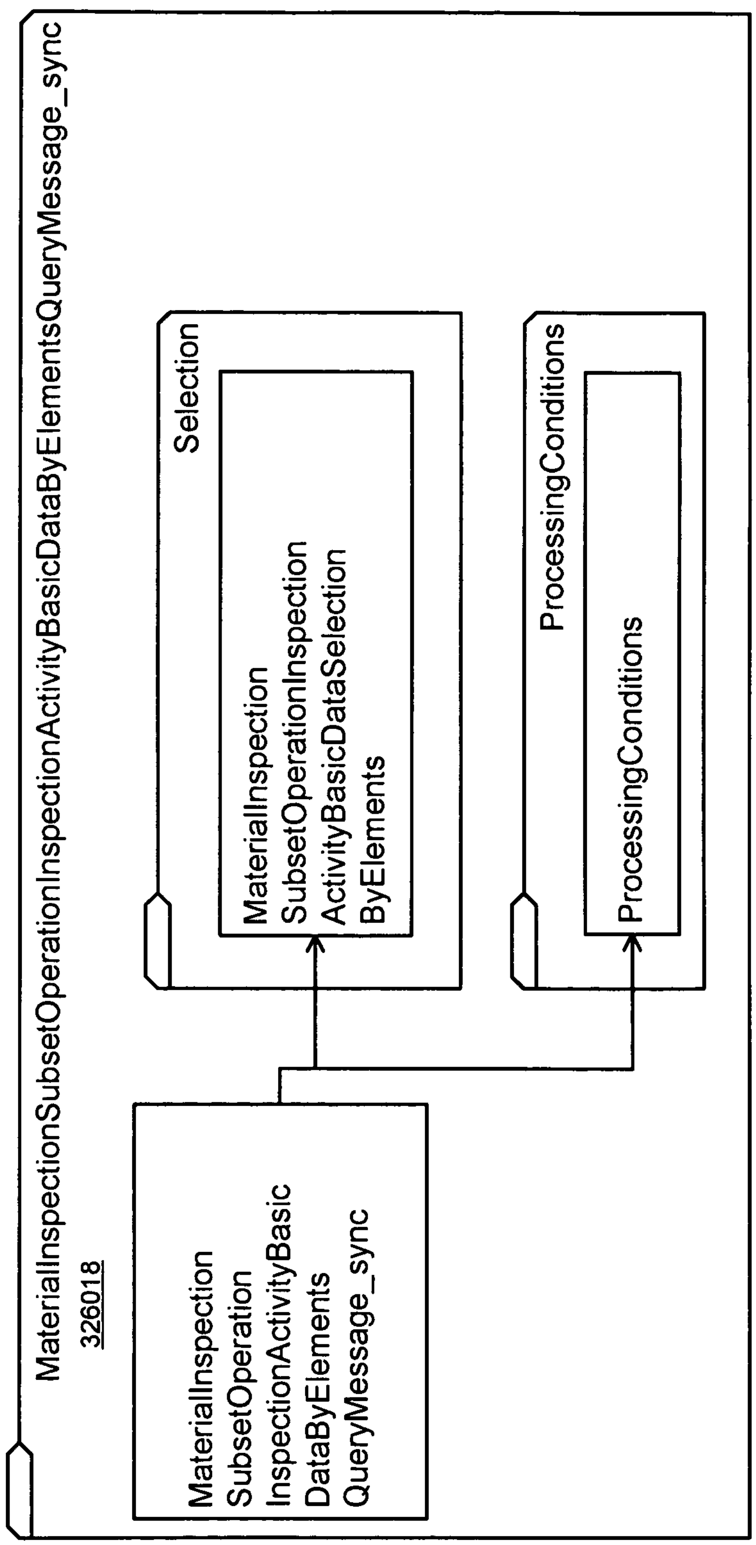
Figure 340:
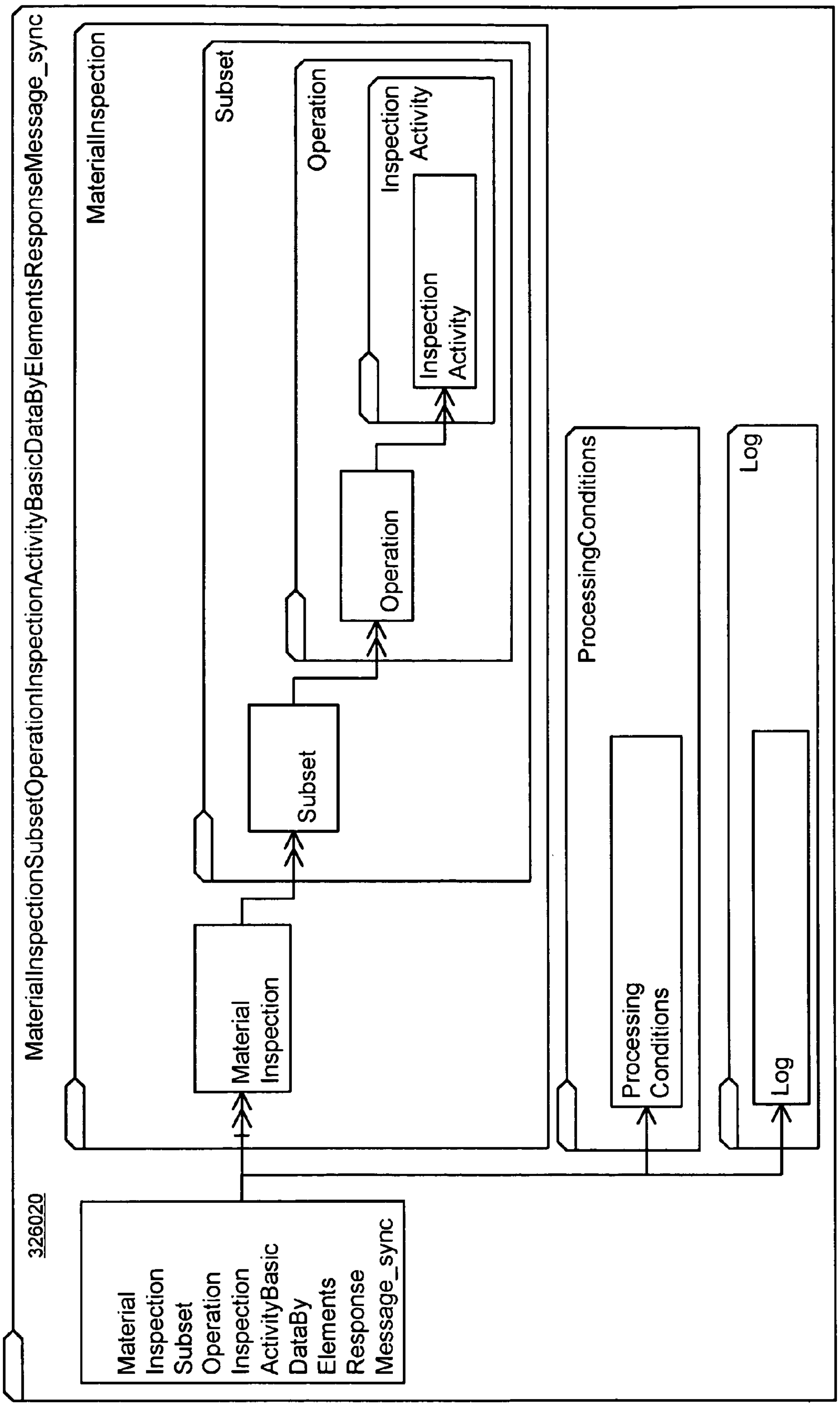
Figure 341:
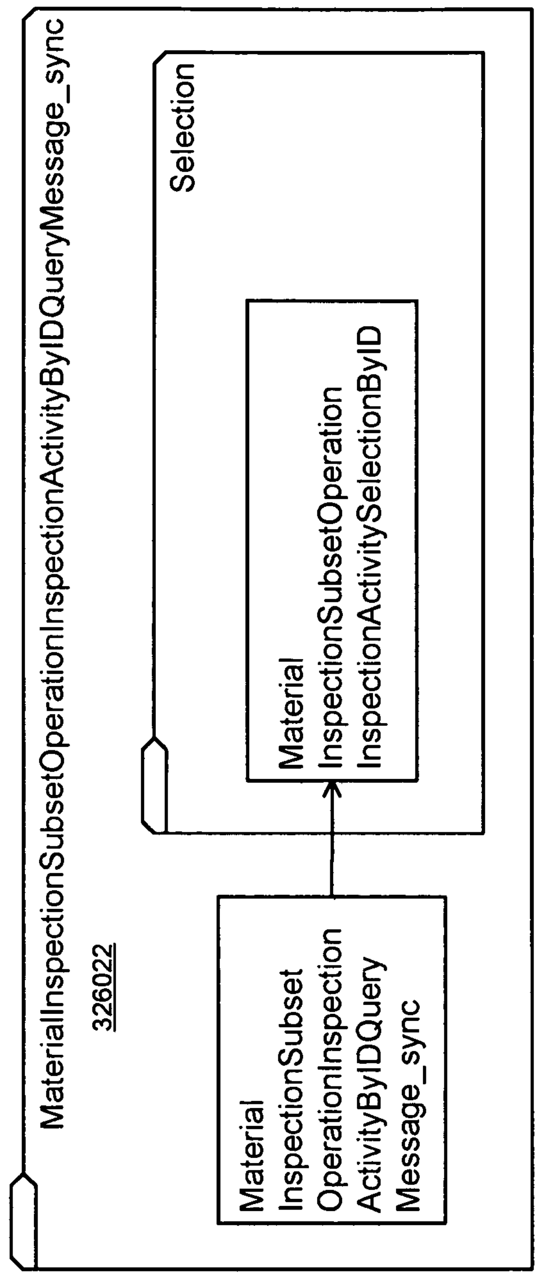
Figure 342:
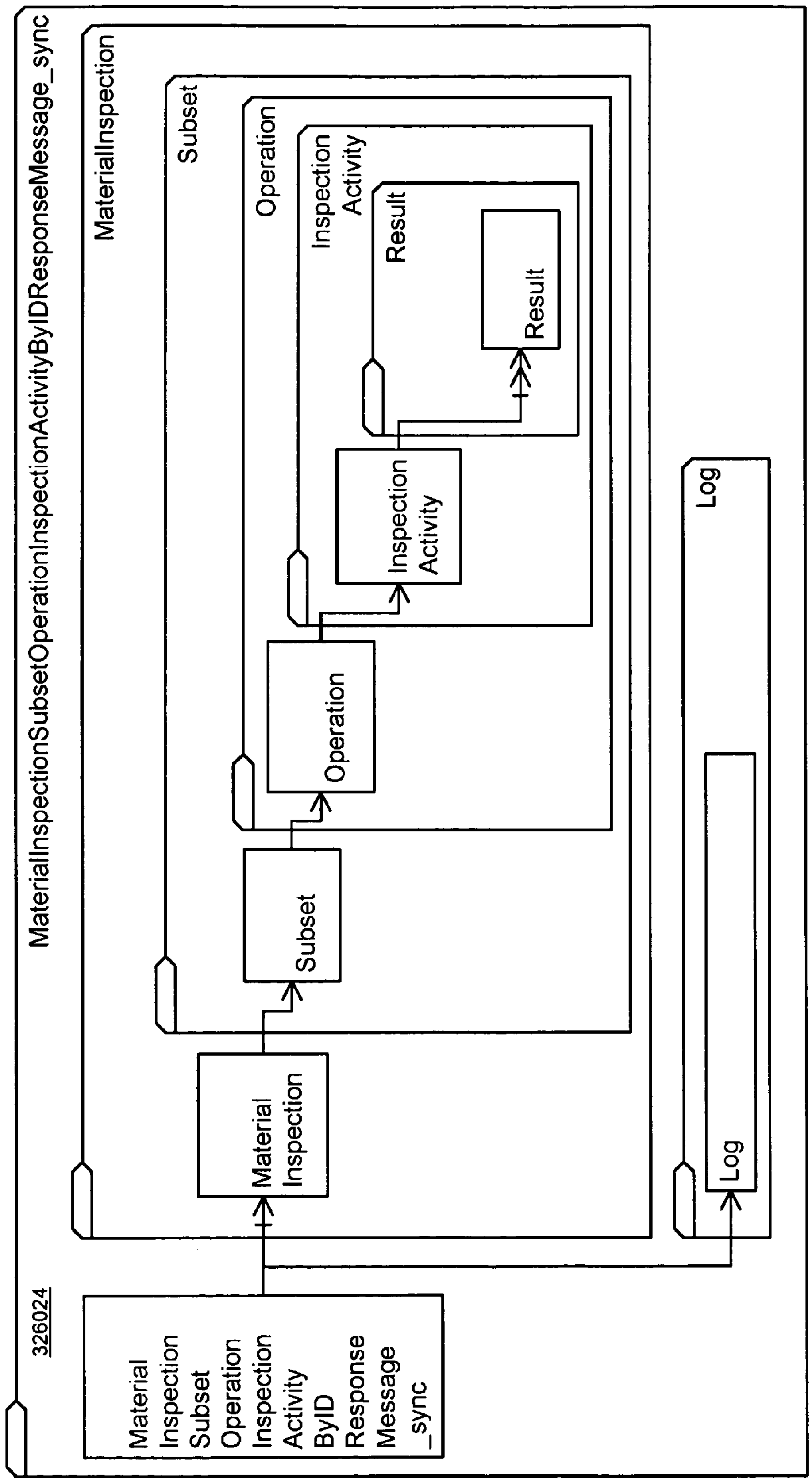
Figure 343:
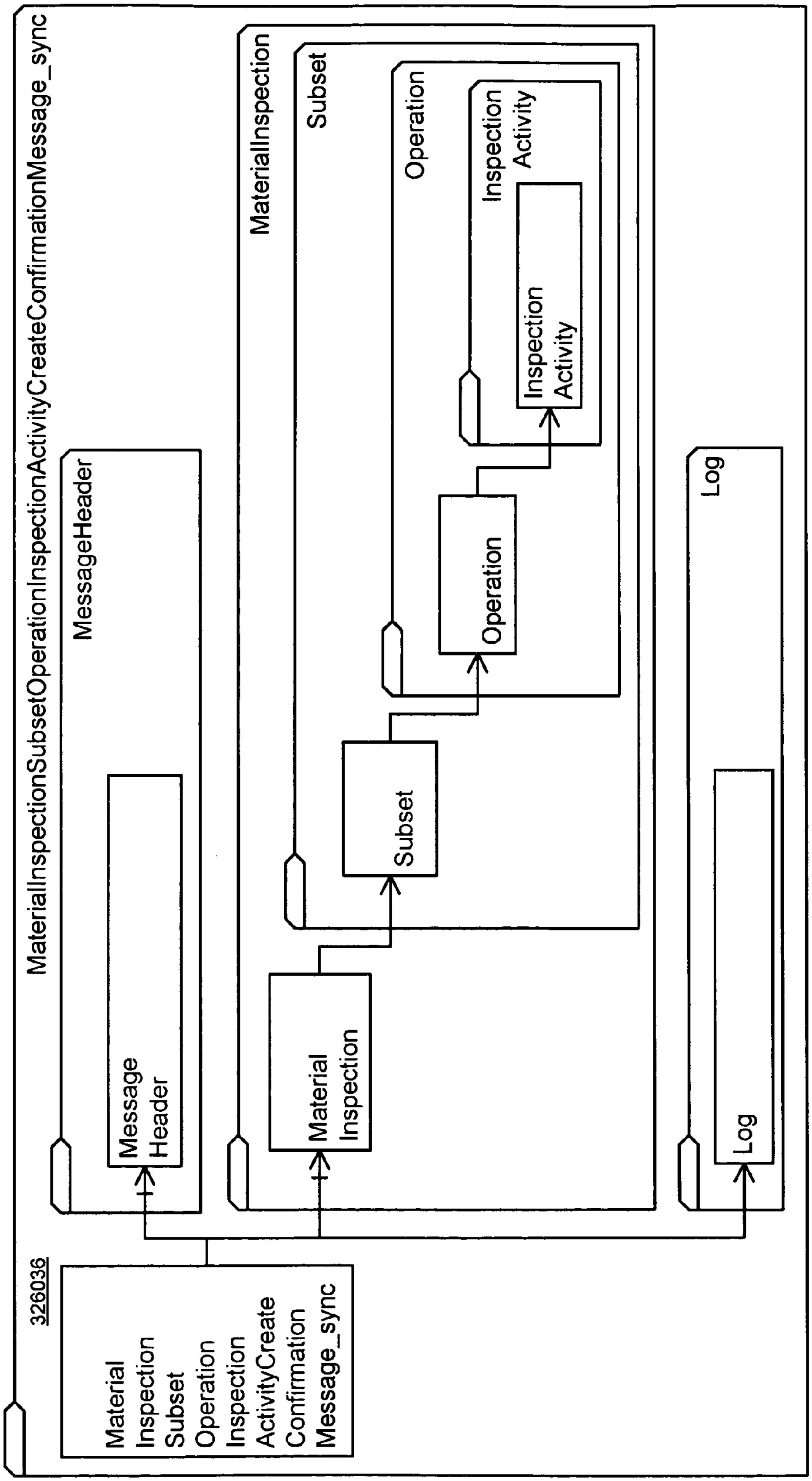
Figure 344:
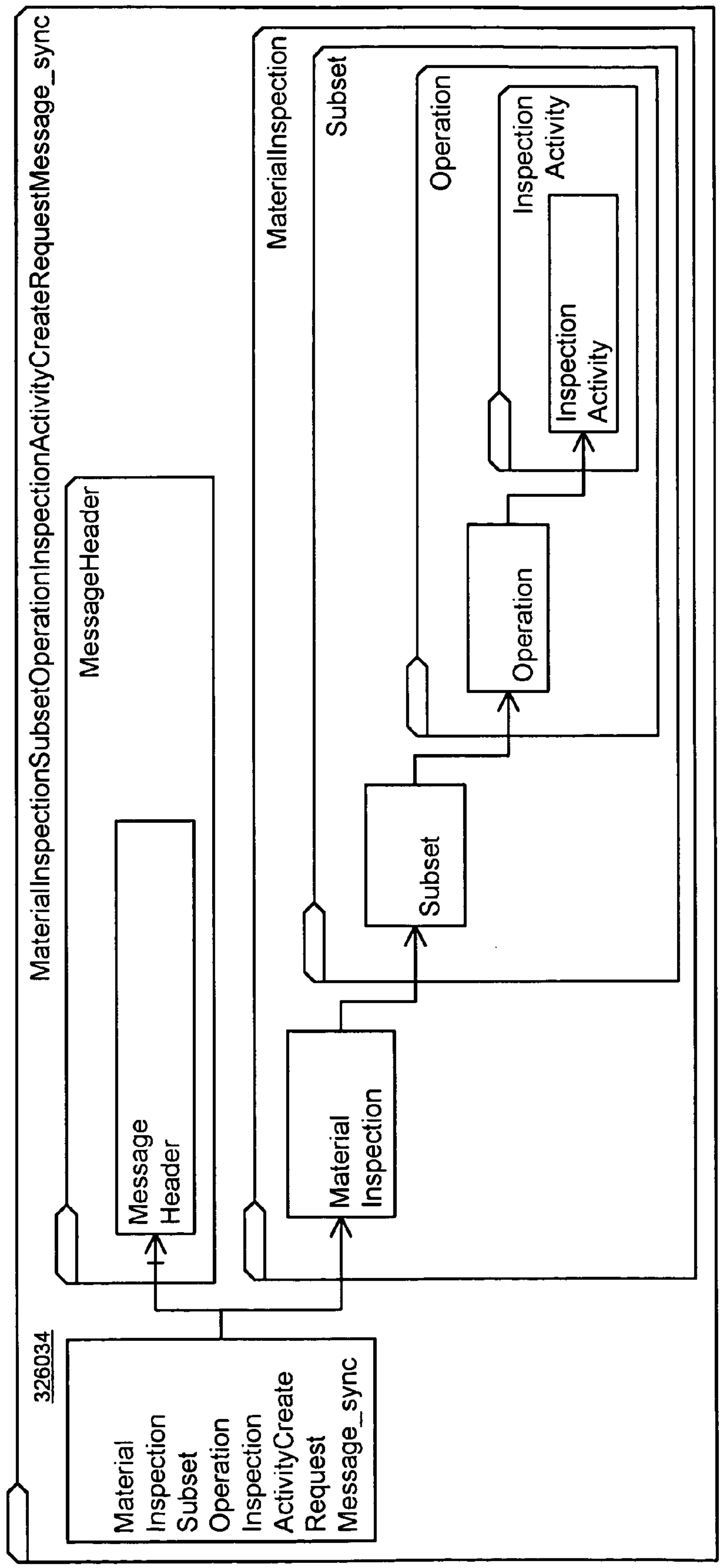
Figure 345:
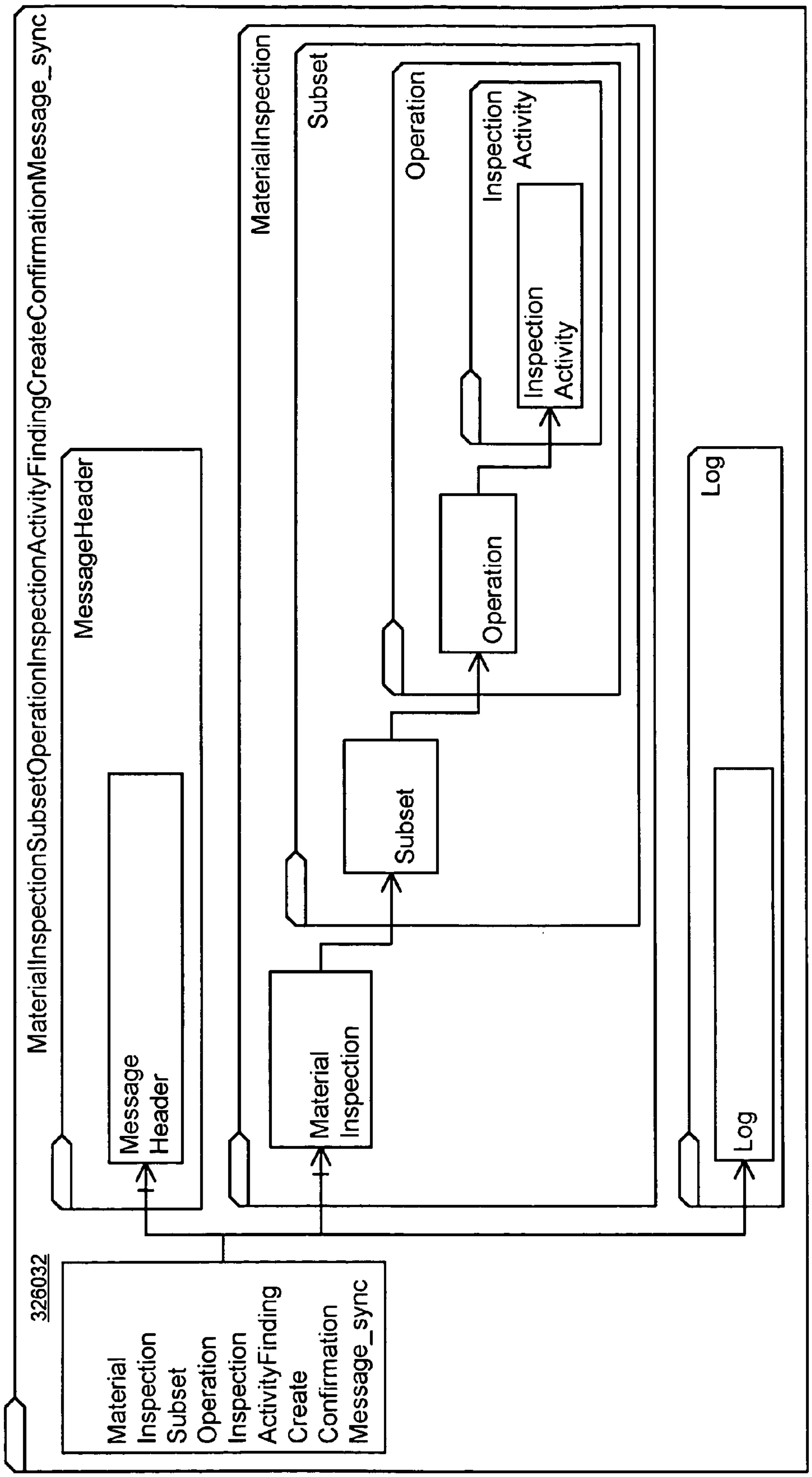
Figure 346:
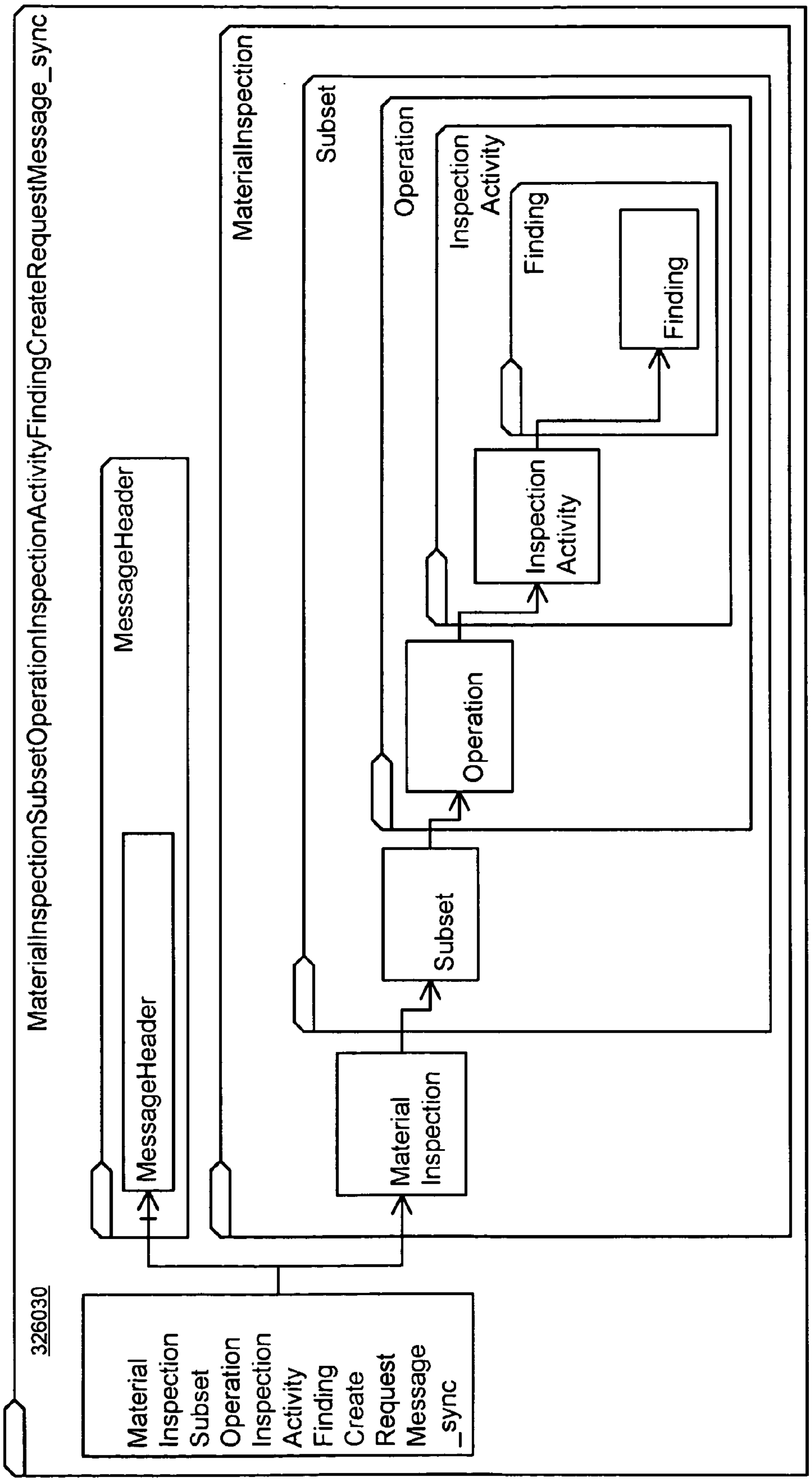
Figure 347:
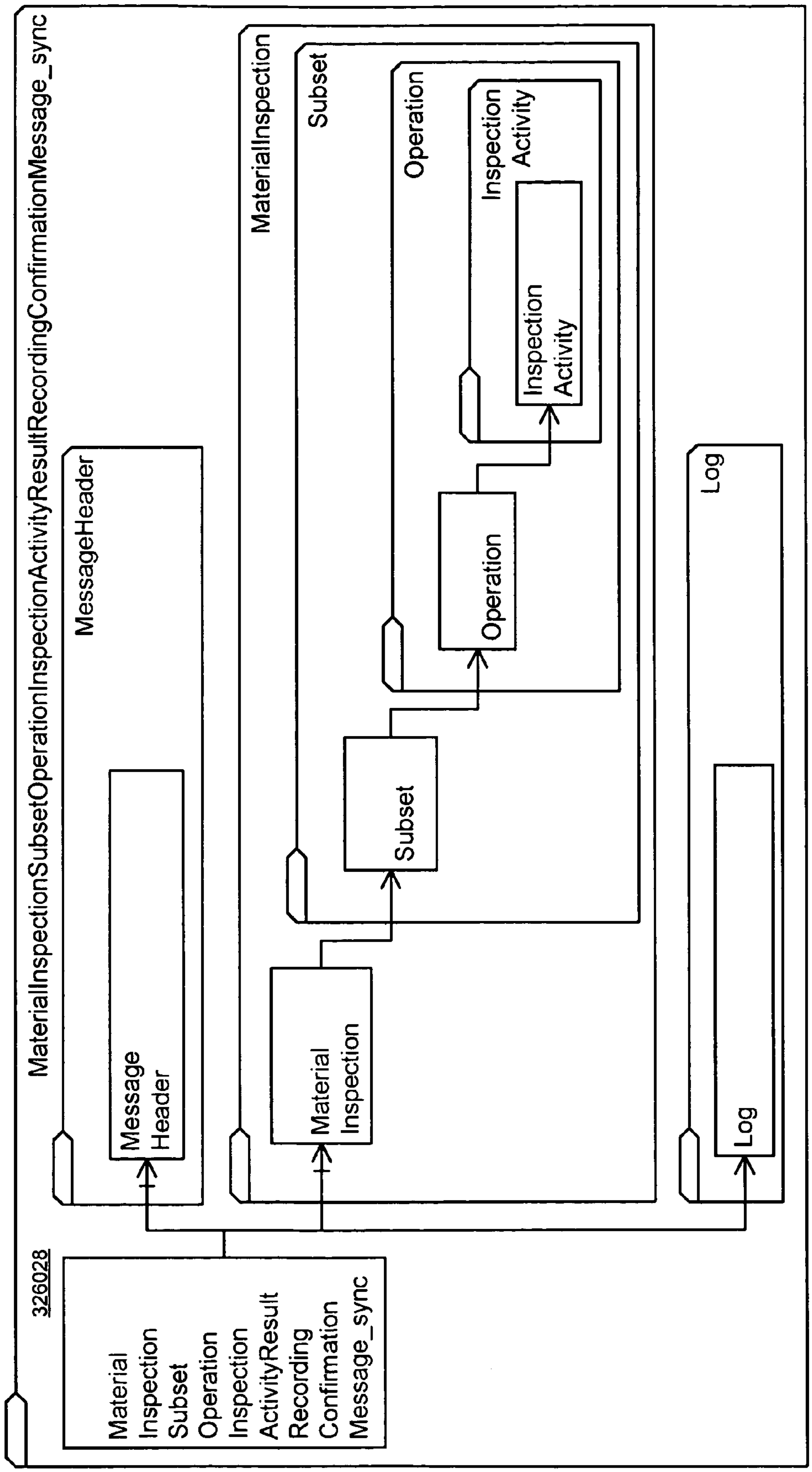
Figure 348:
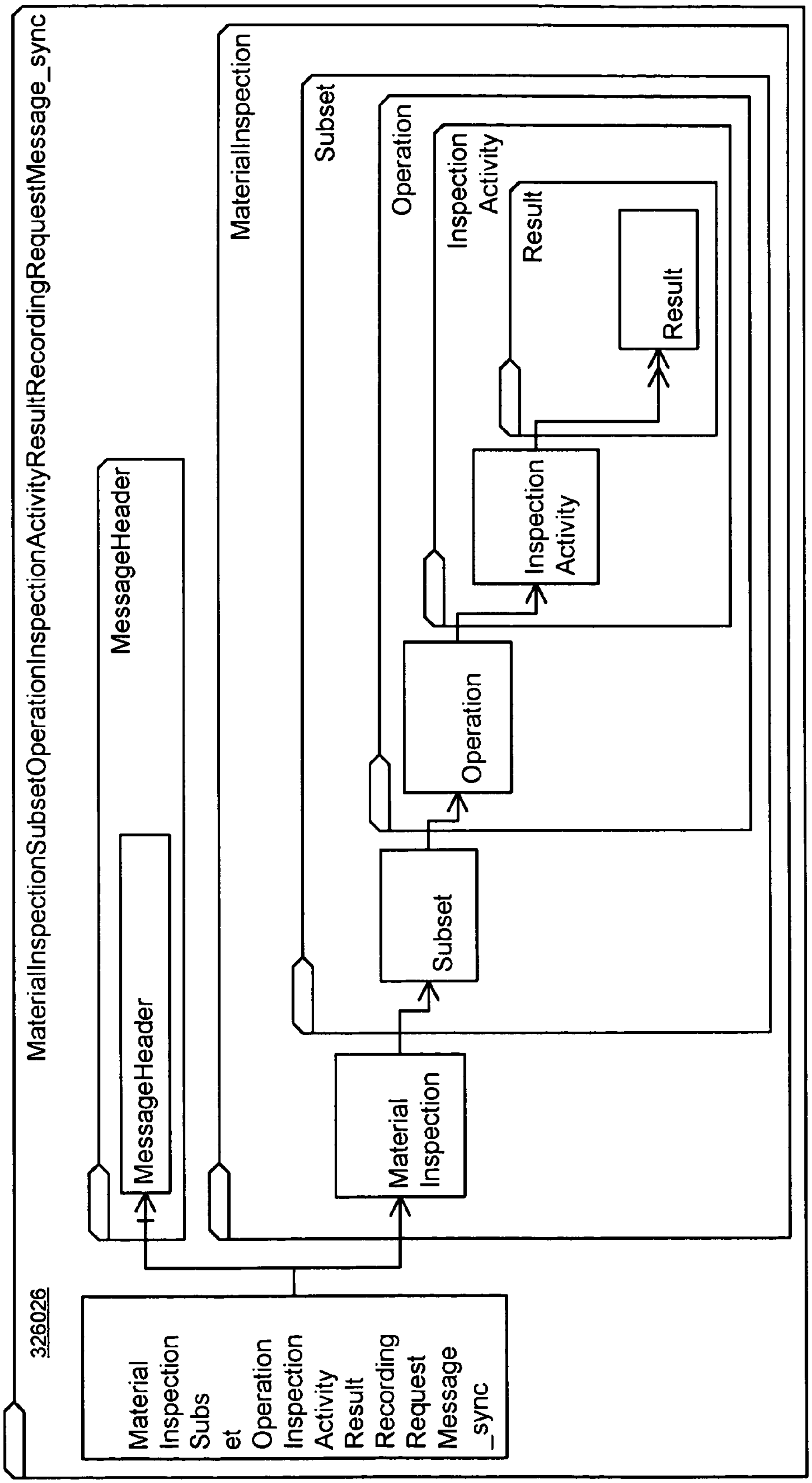
Figure 371:
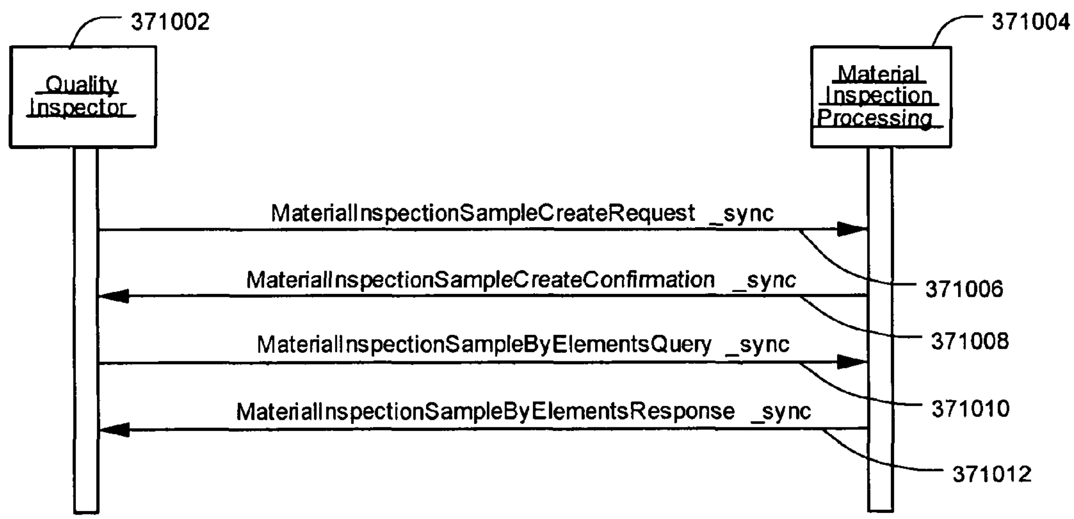
Figure 372:
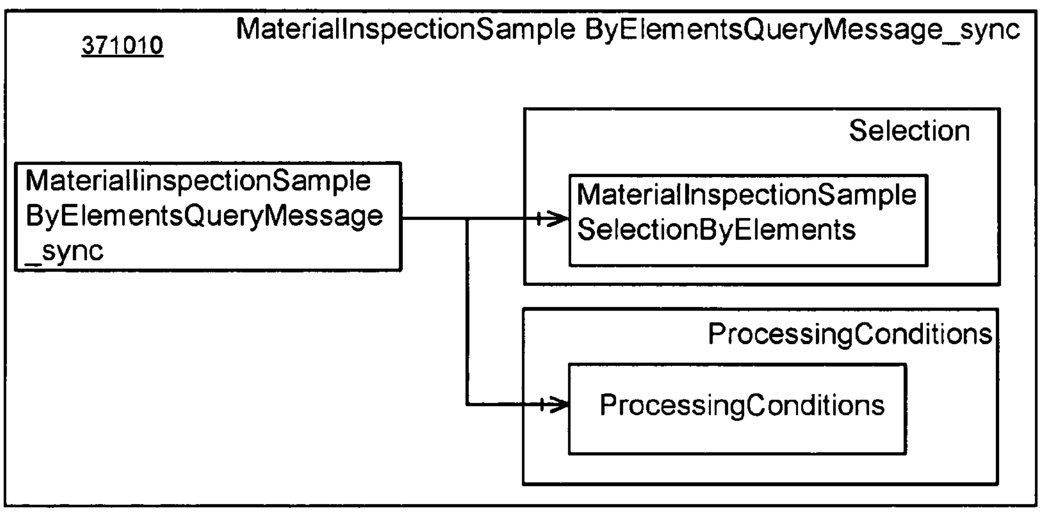
Figure 373:
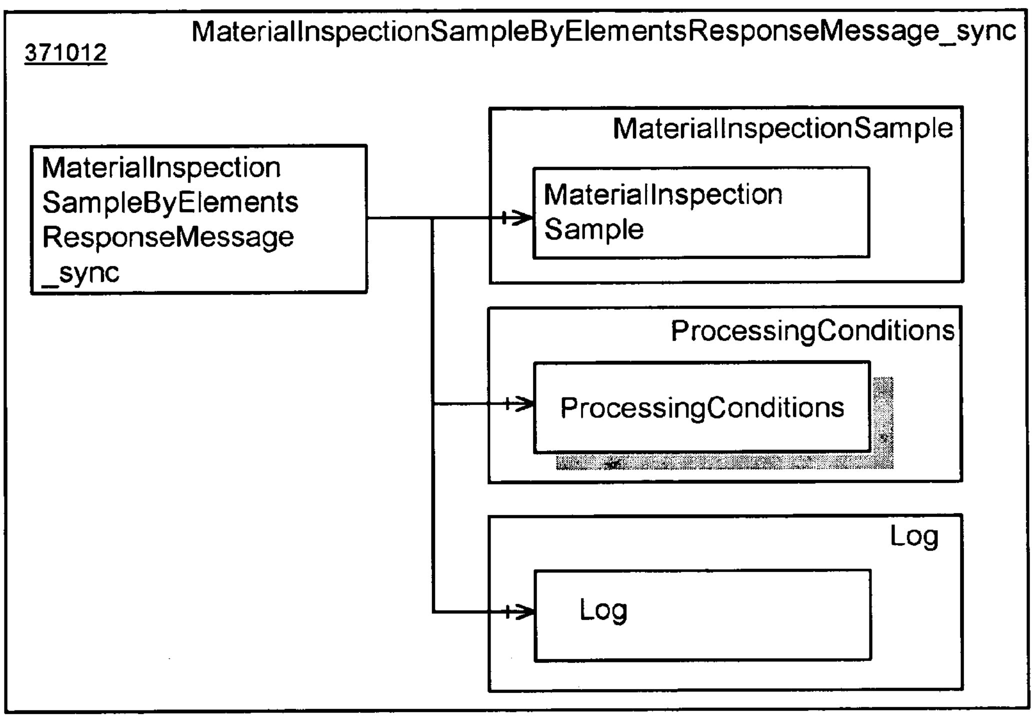
Figure 374:
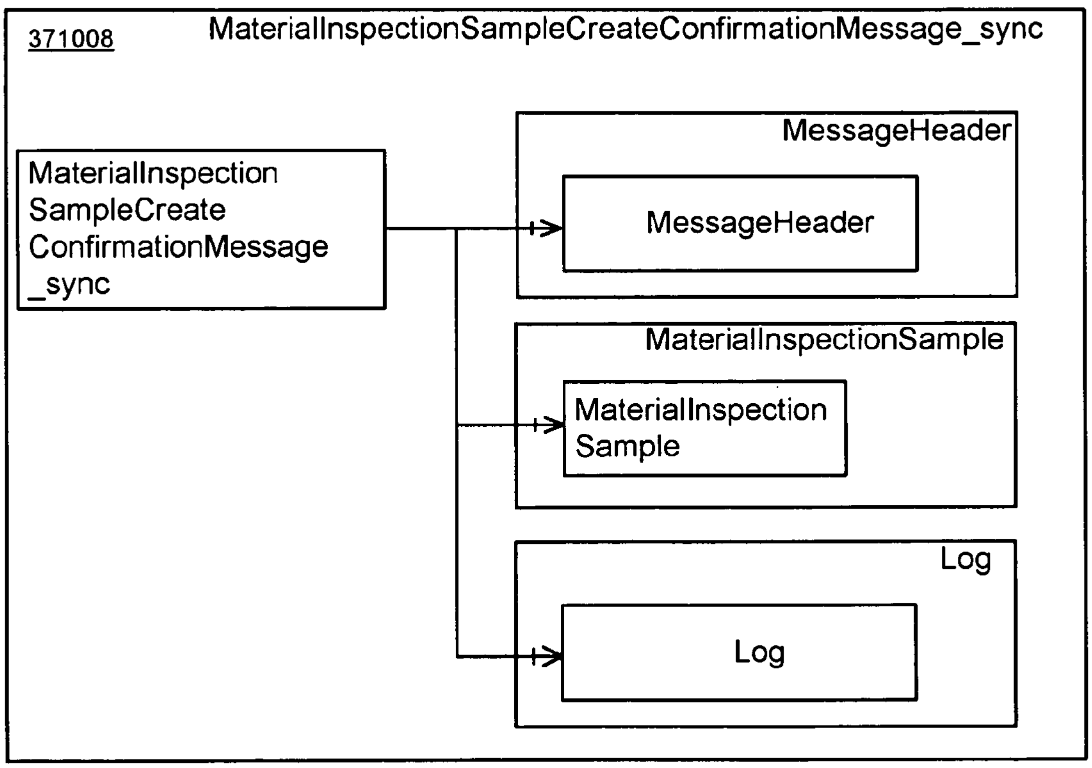
Figure 375:
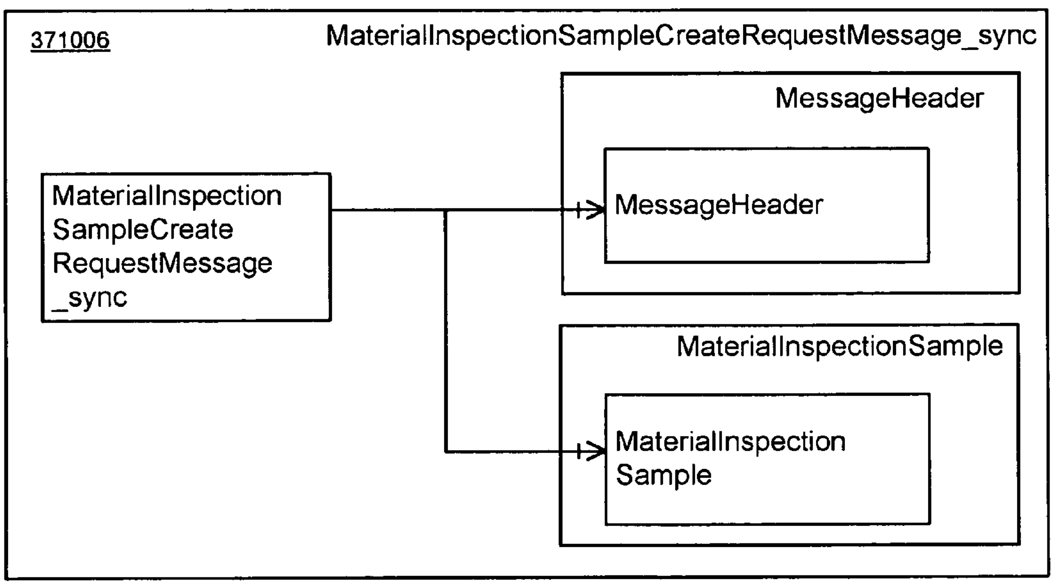
Figure 380:
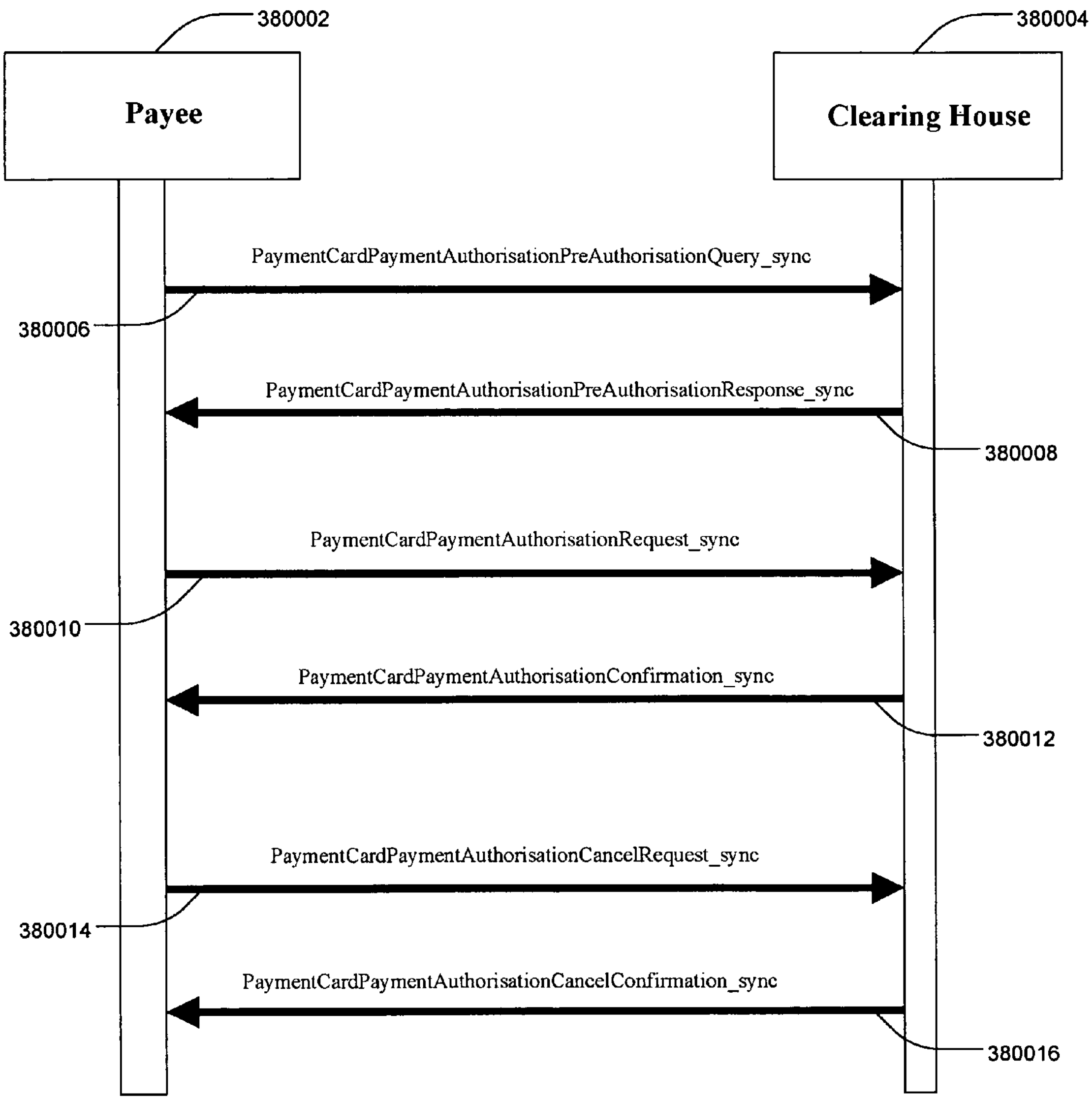
Figure 381:
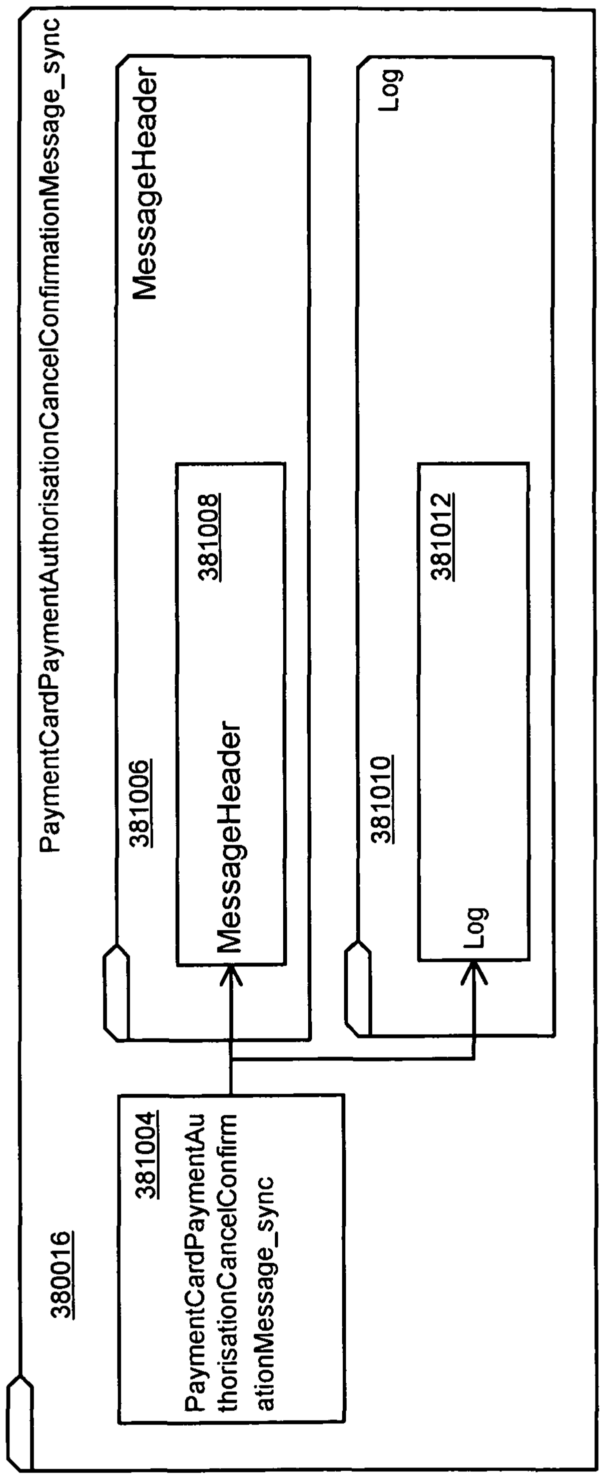
Figure 382:
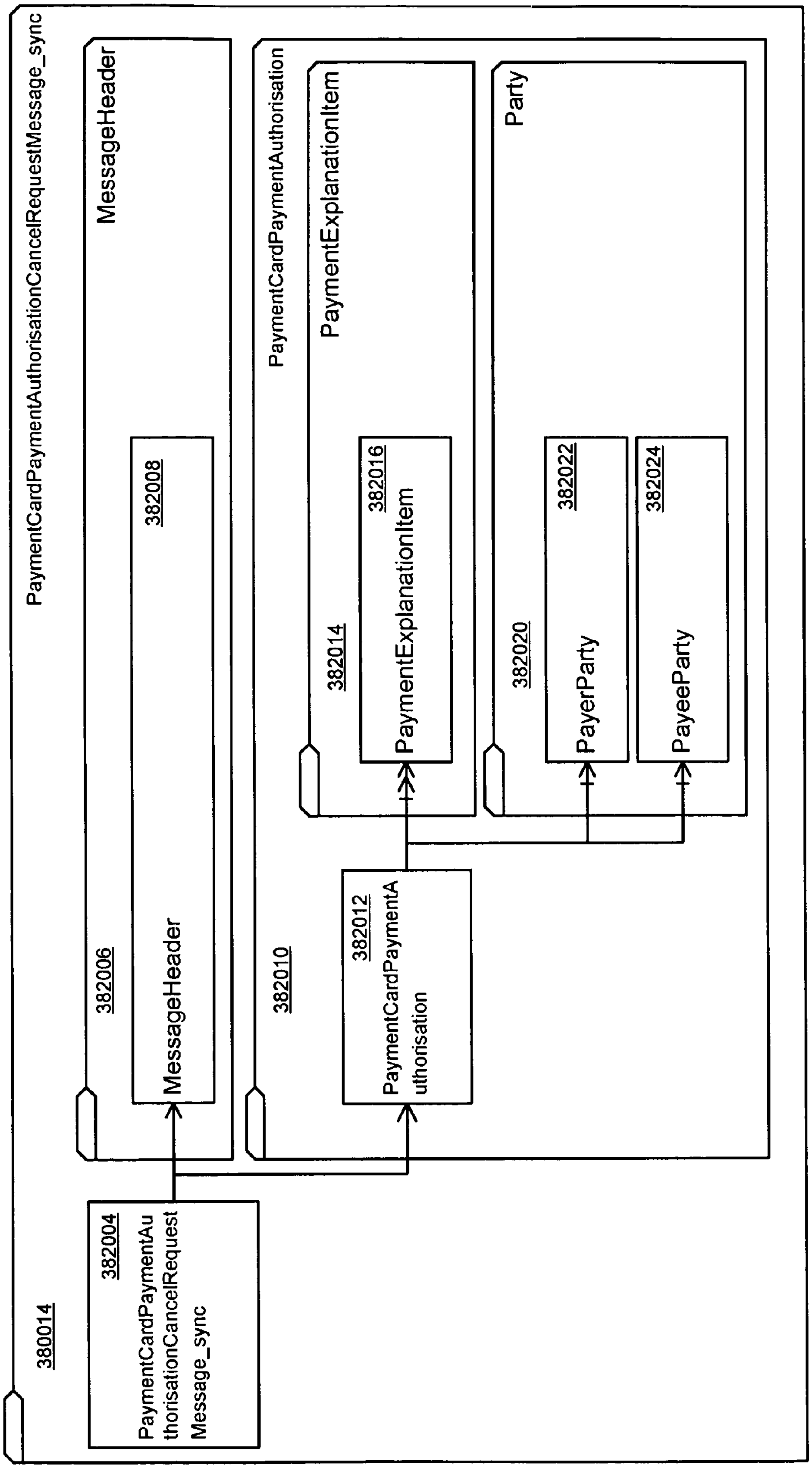
Figure 383:
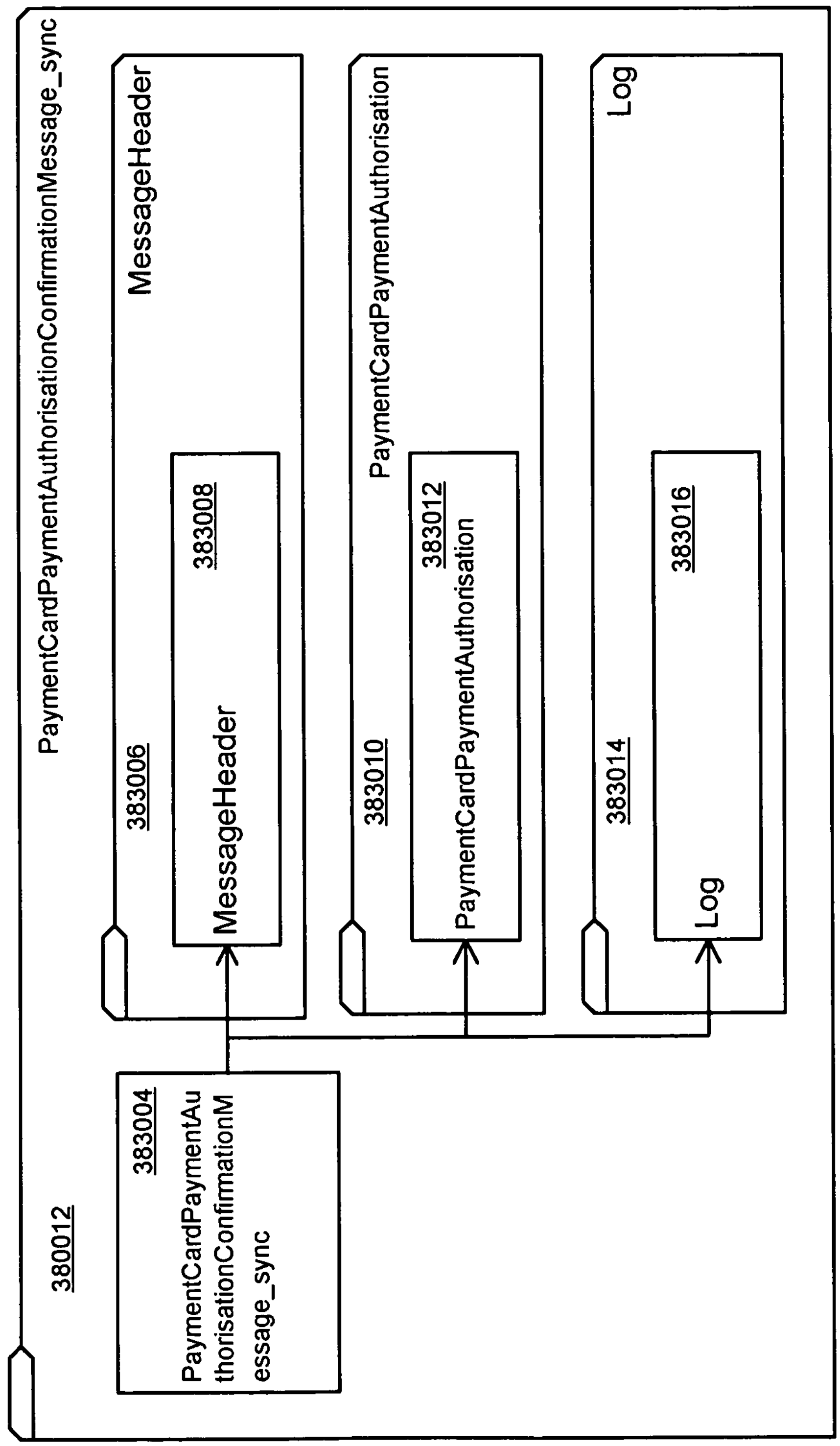
Figure 384:
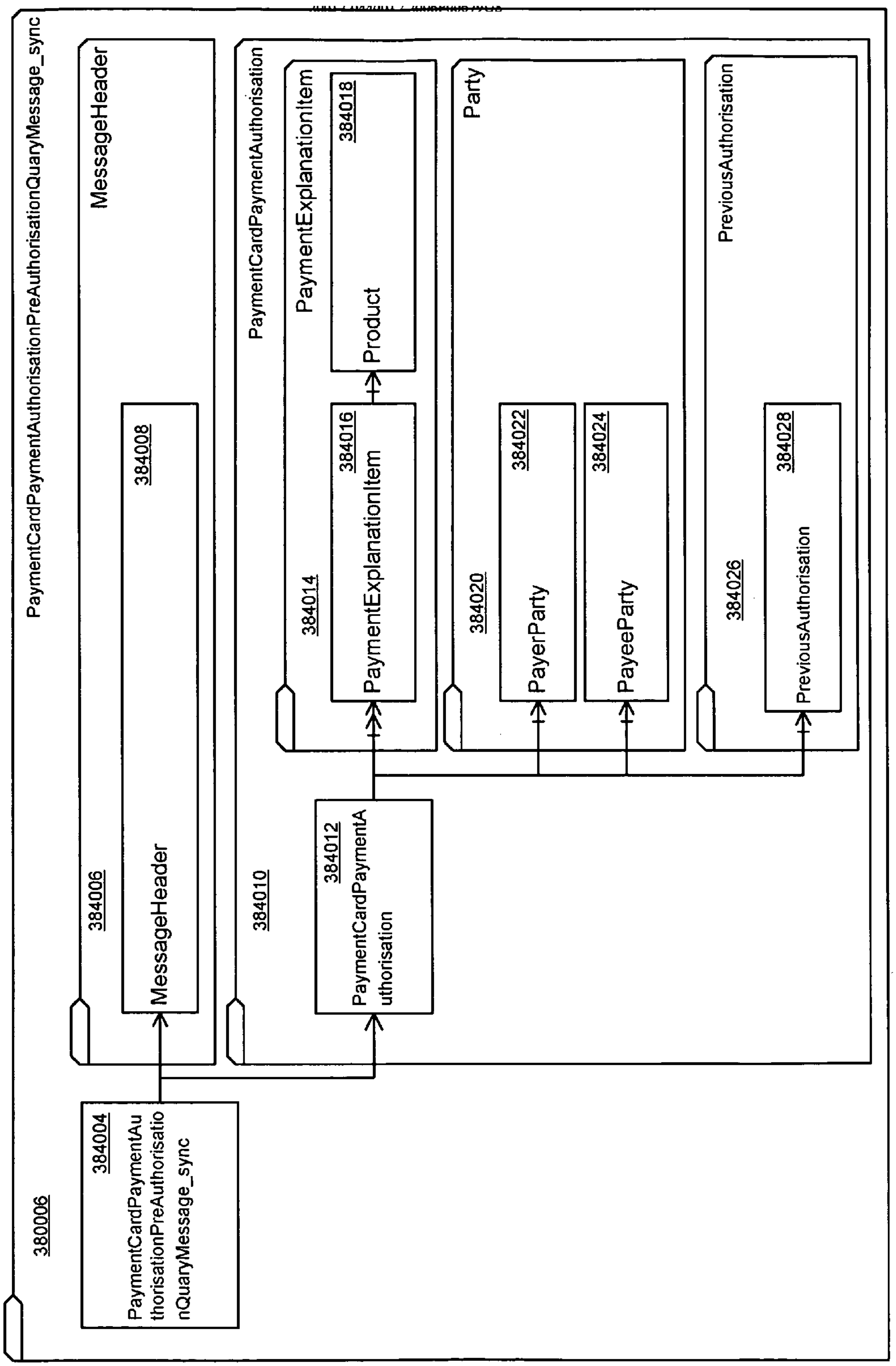
Figure 385:
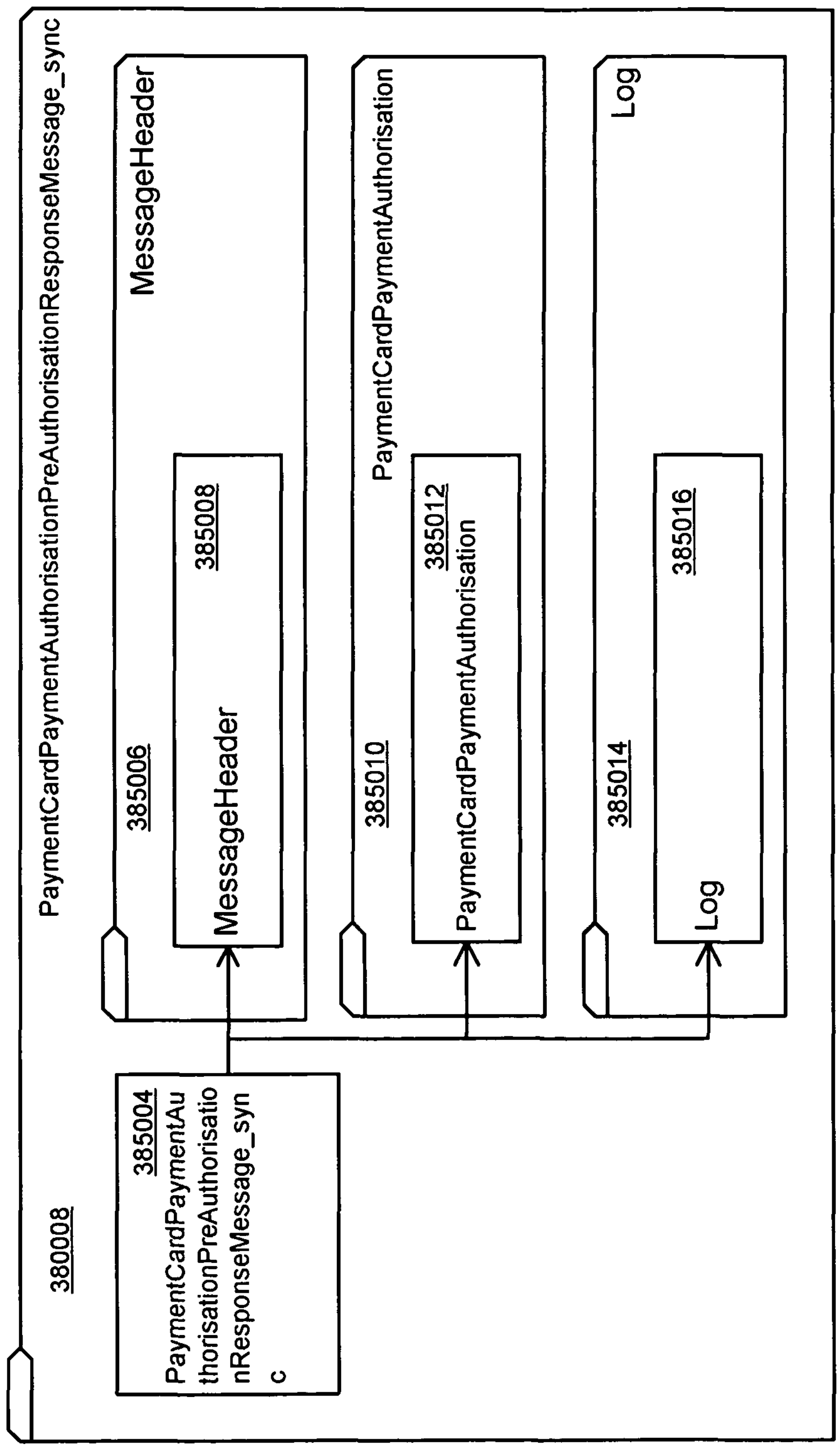
Figure 386:
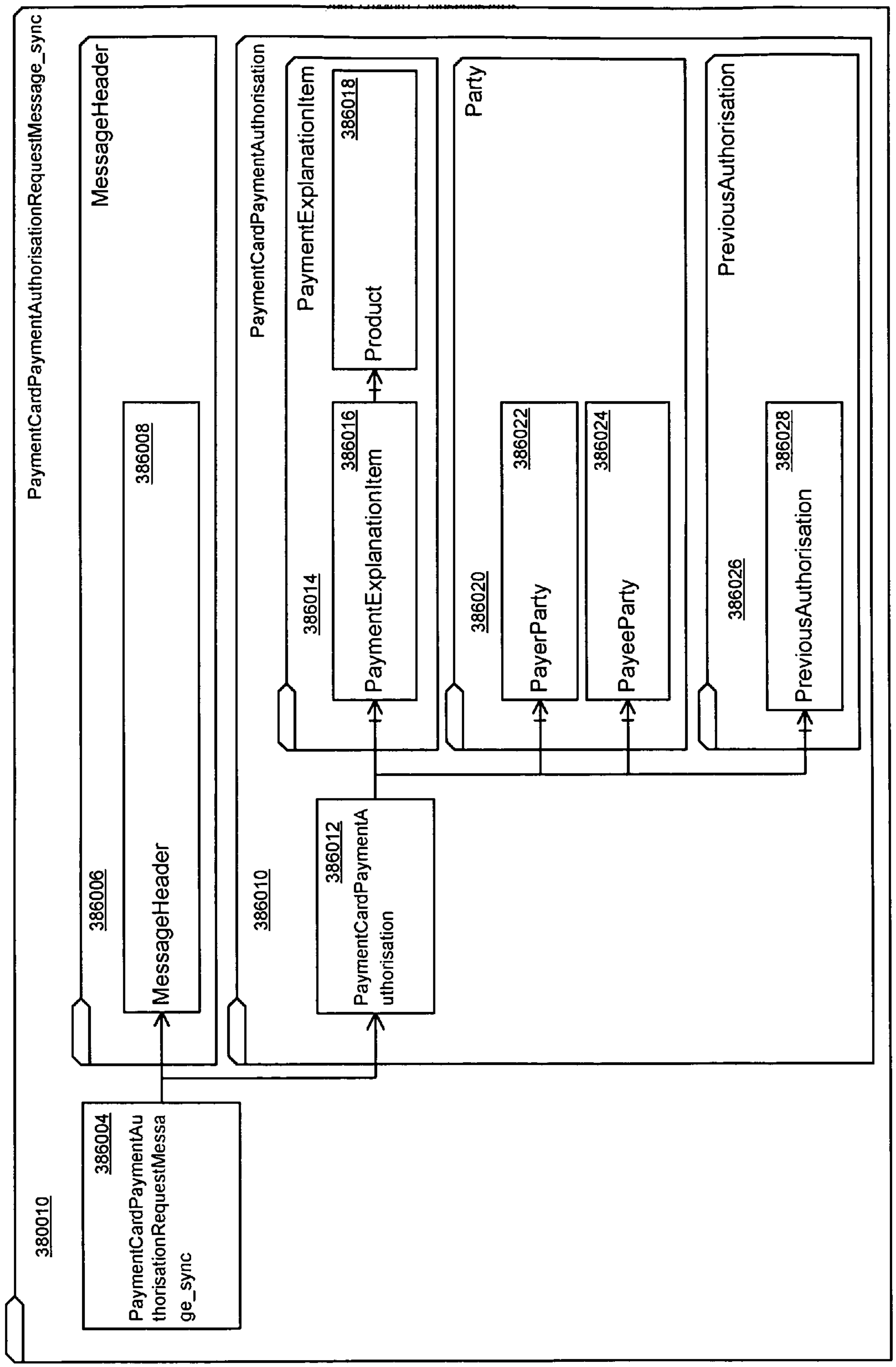
Figure 387:
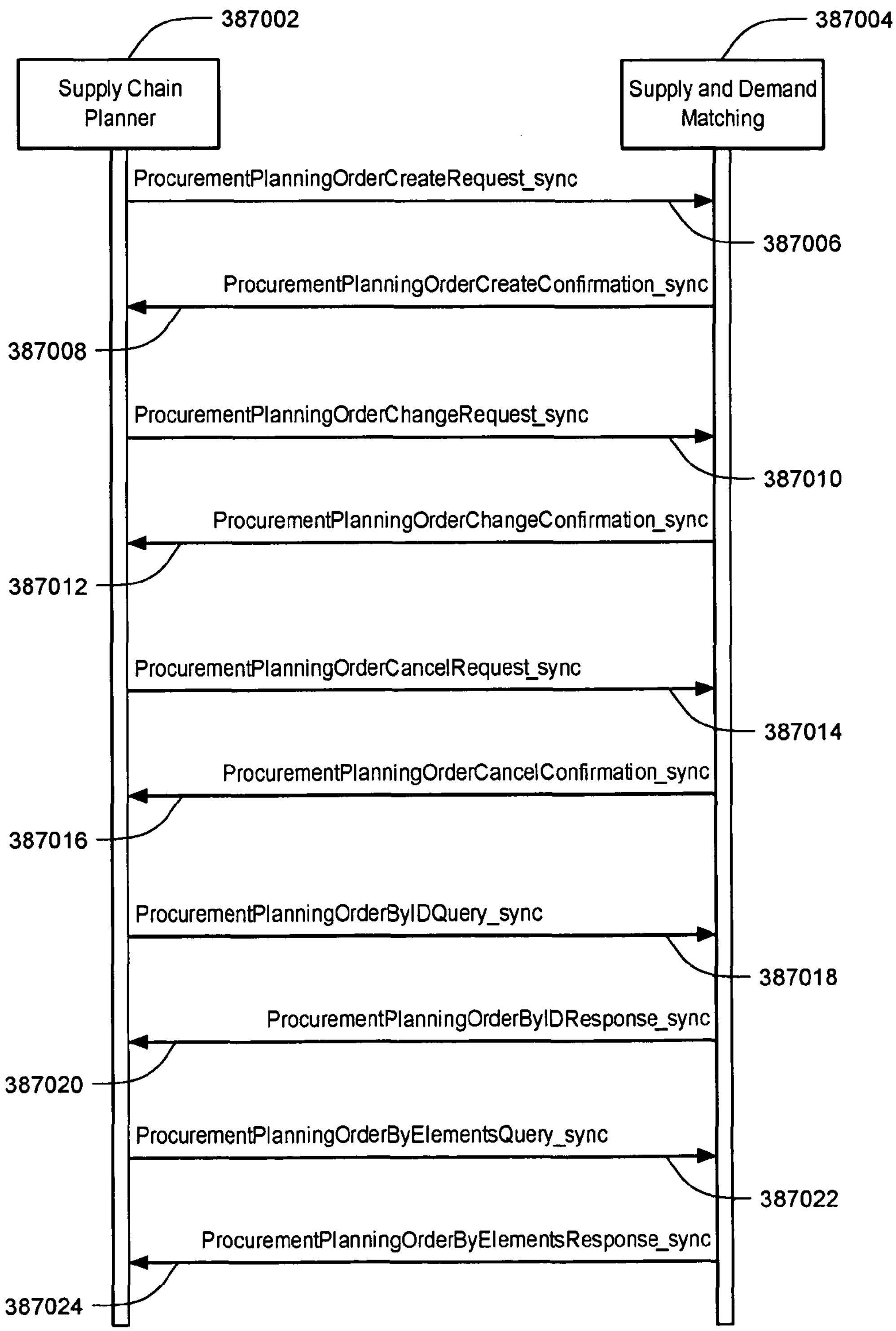
Figure 388:
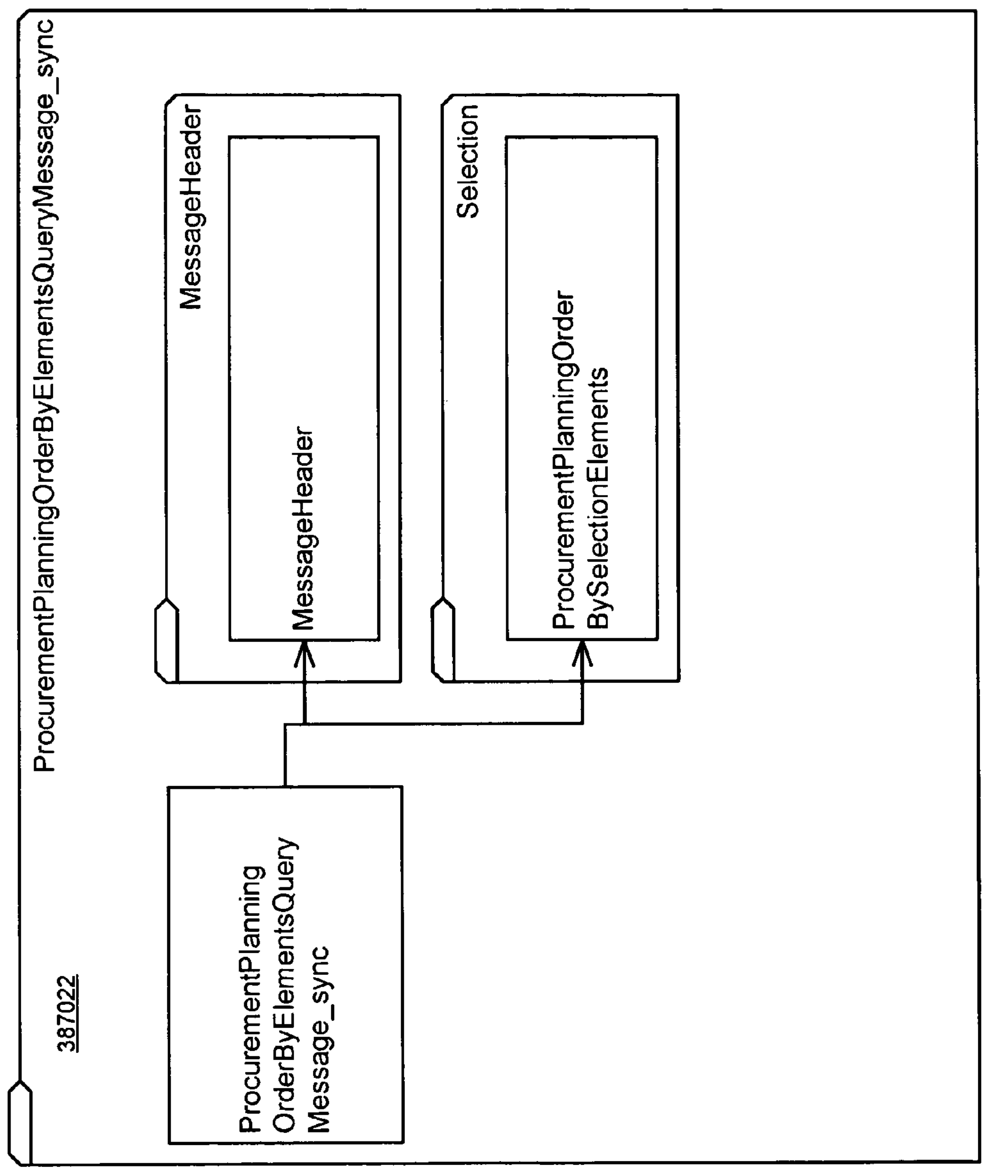
Figure 389:
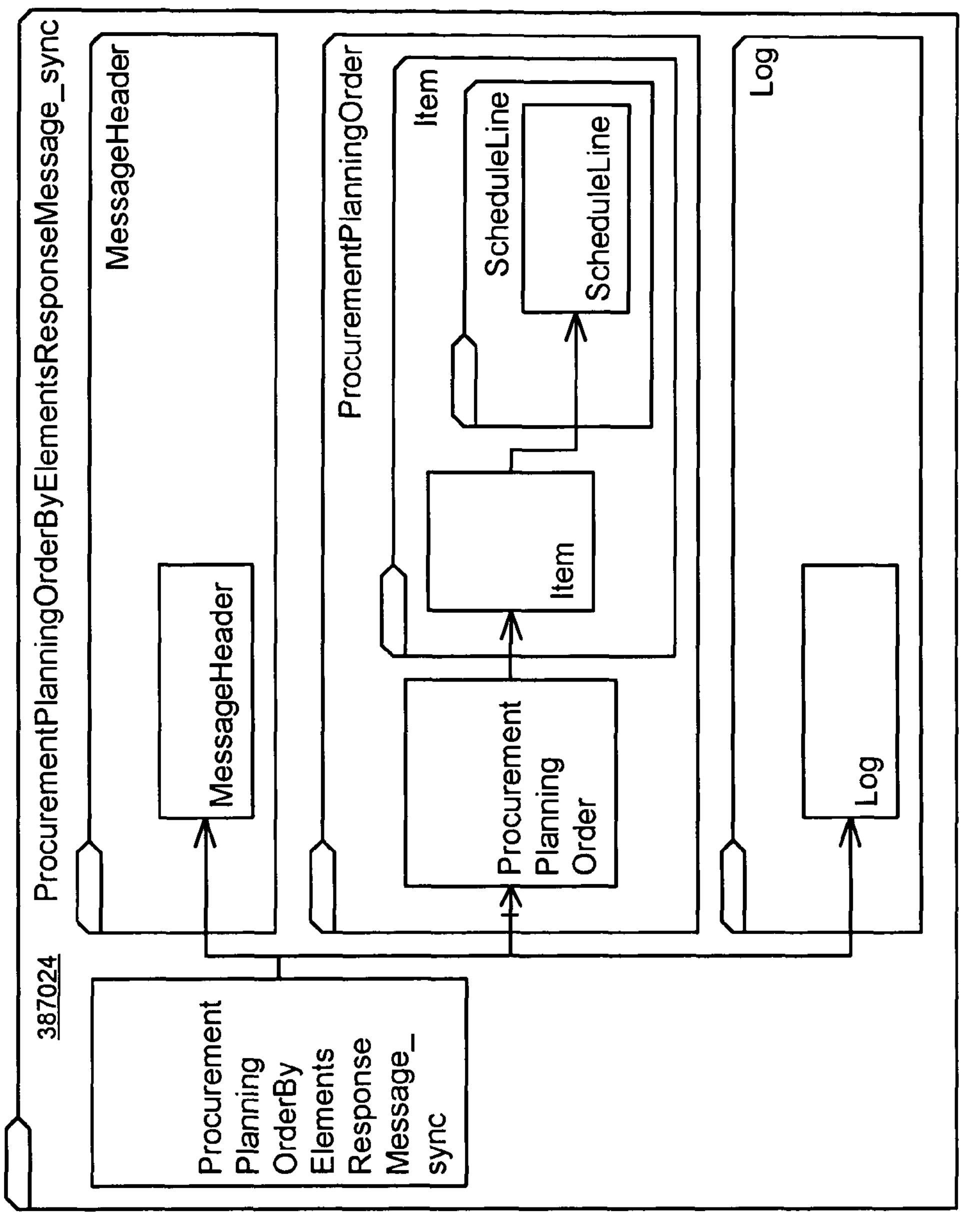
Figure 390:
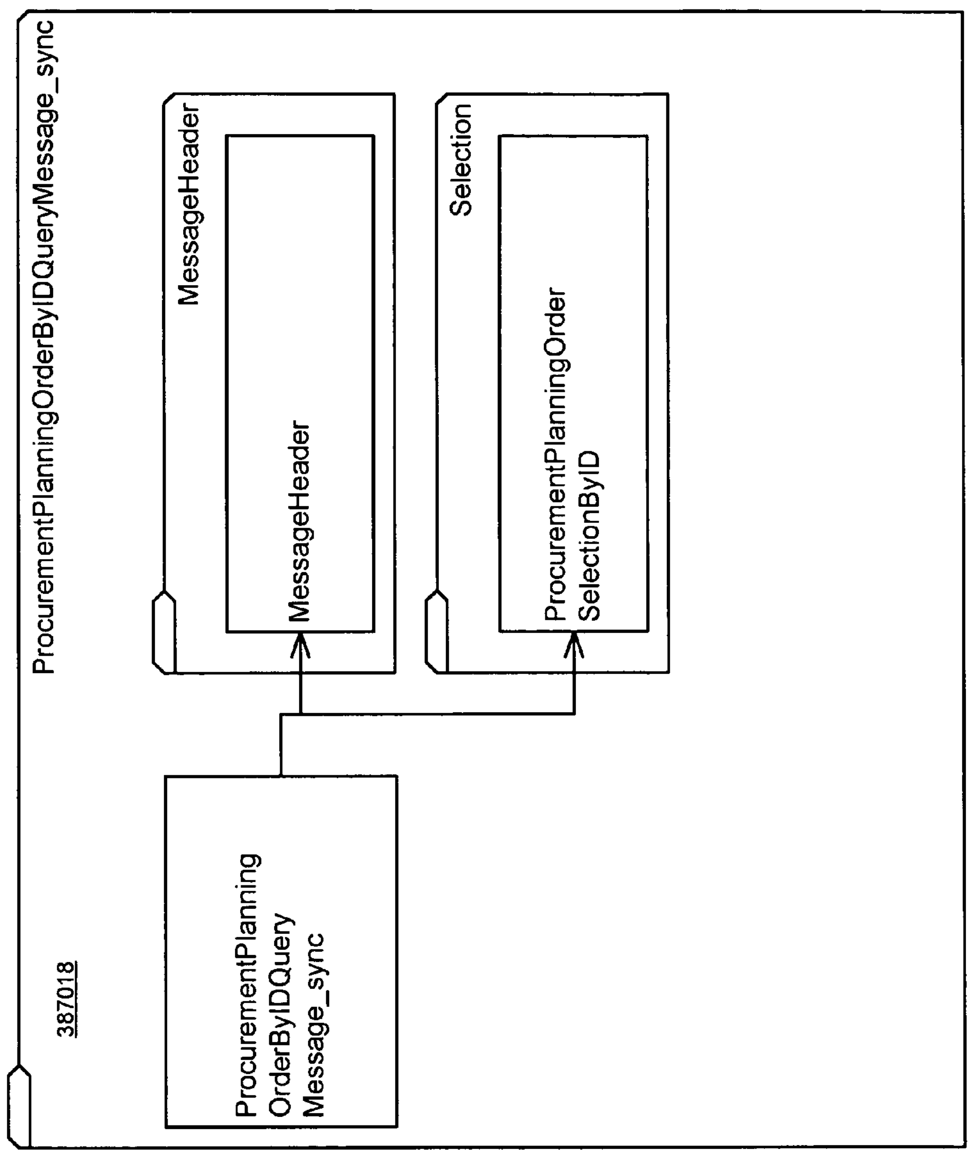
Figure 391:
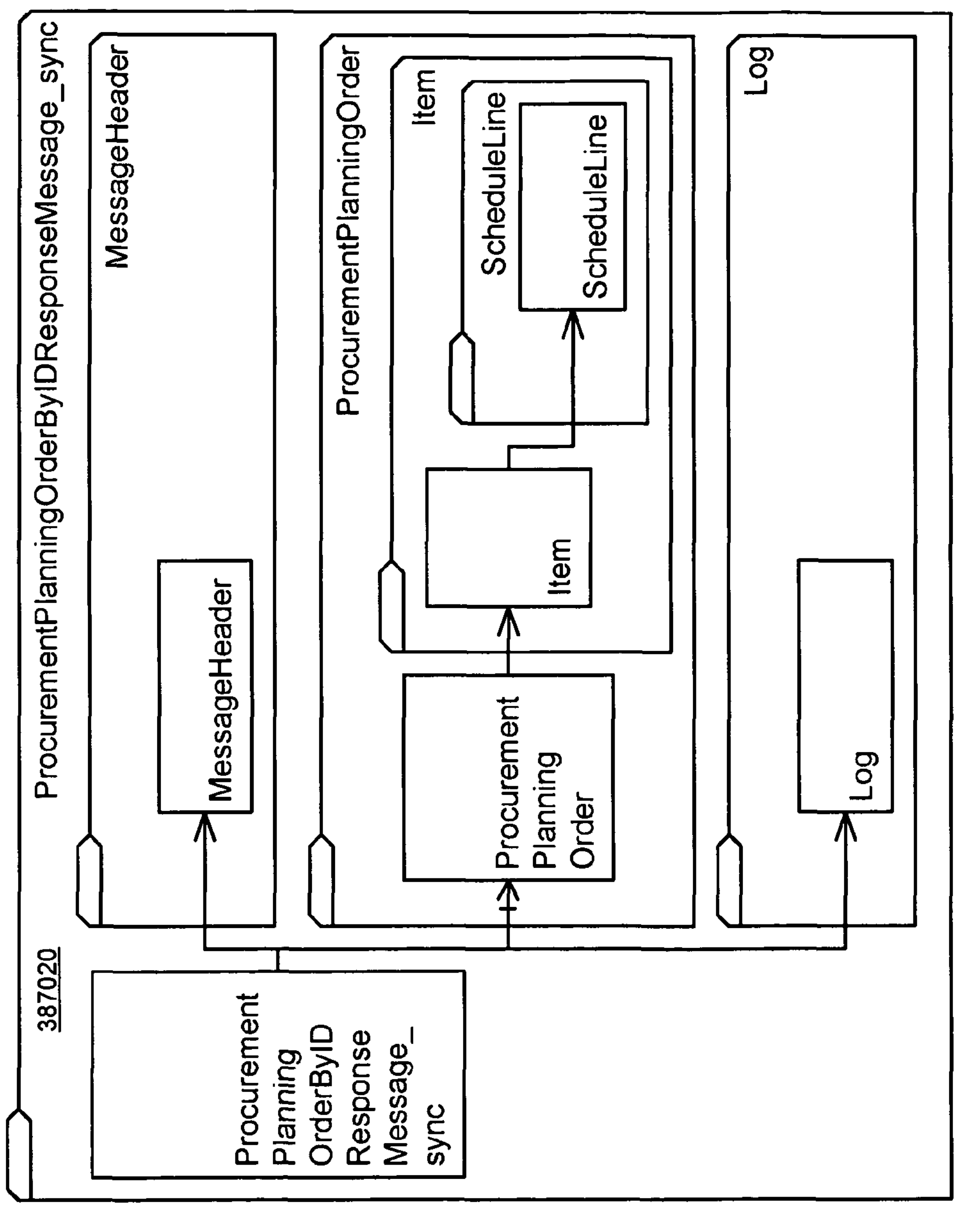
Figure 392:
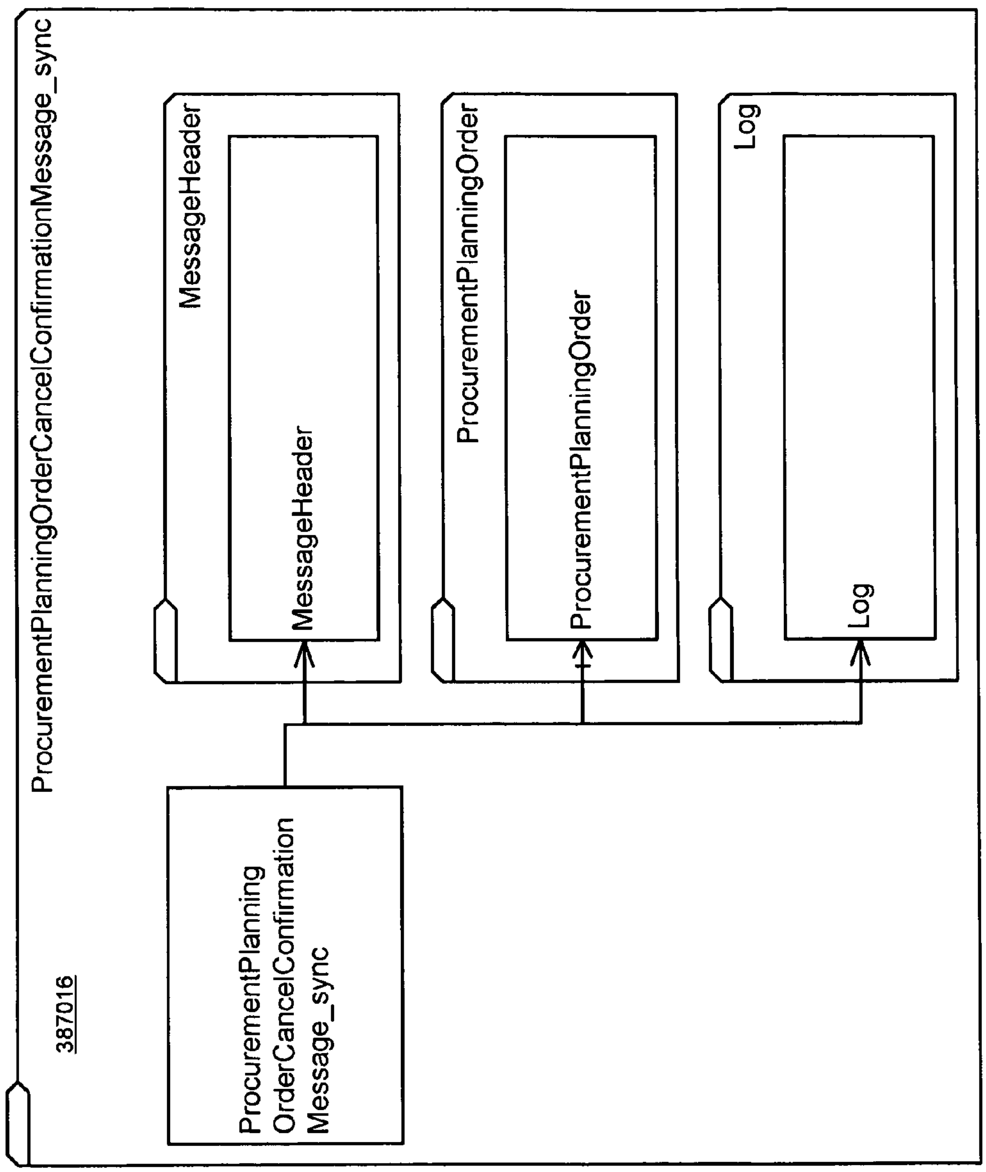
Figure 393:
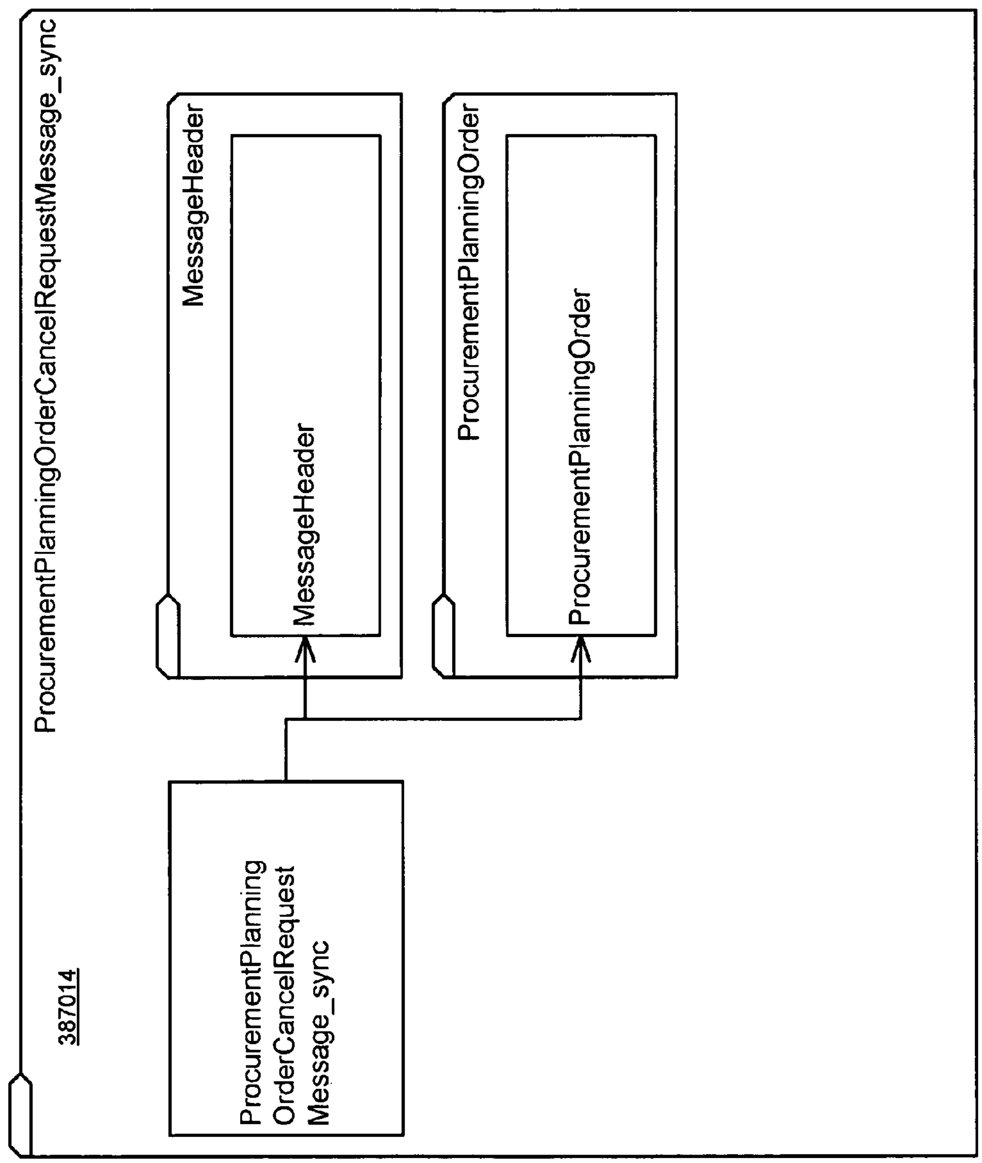
Figure 394:
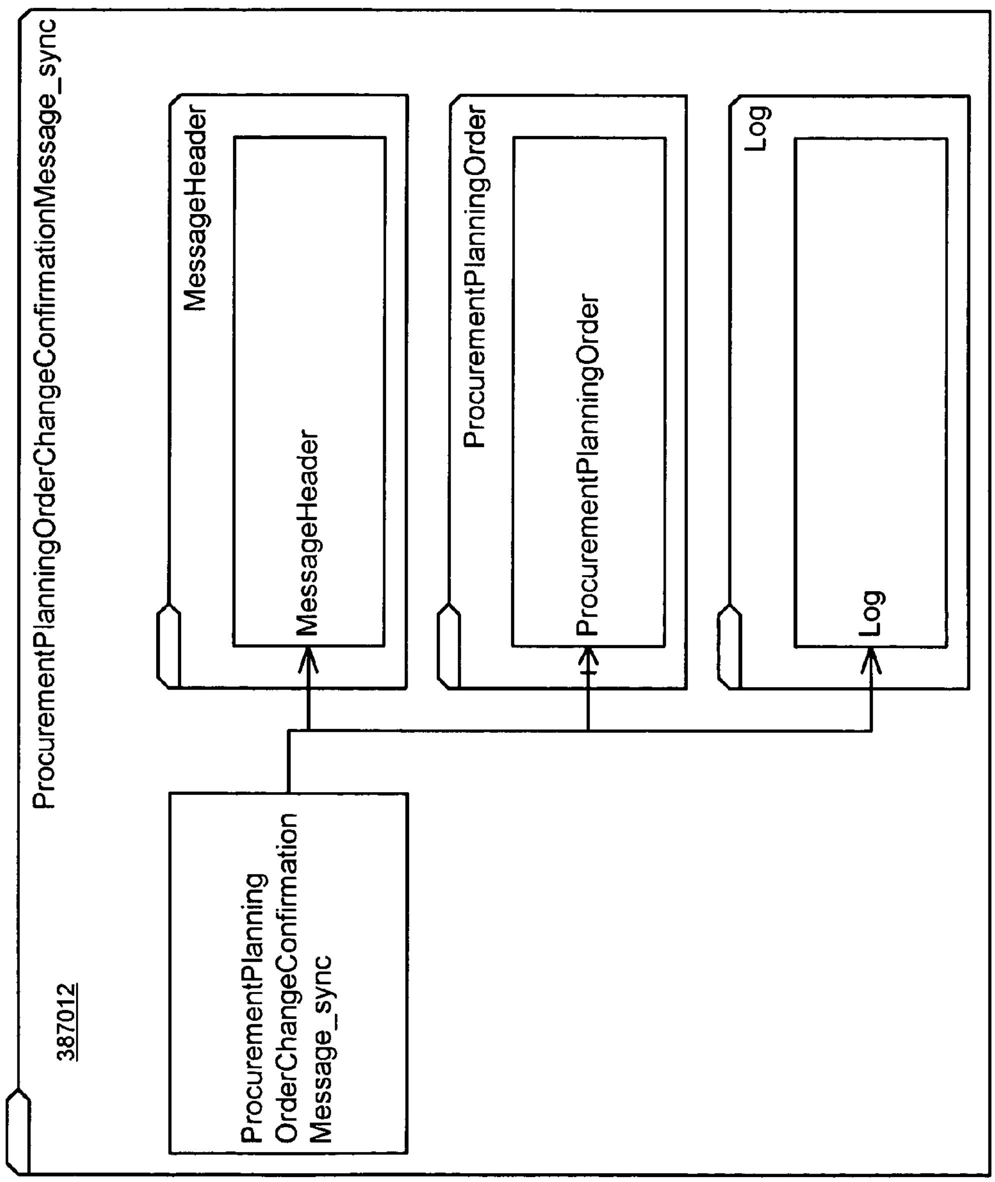
Figure 395:
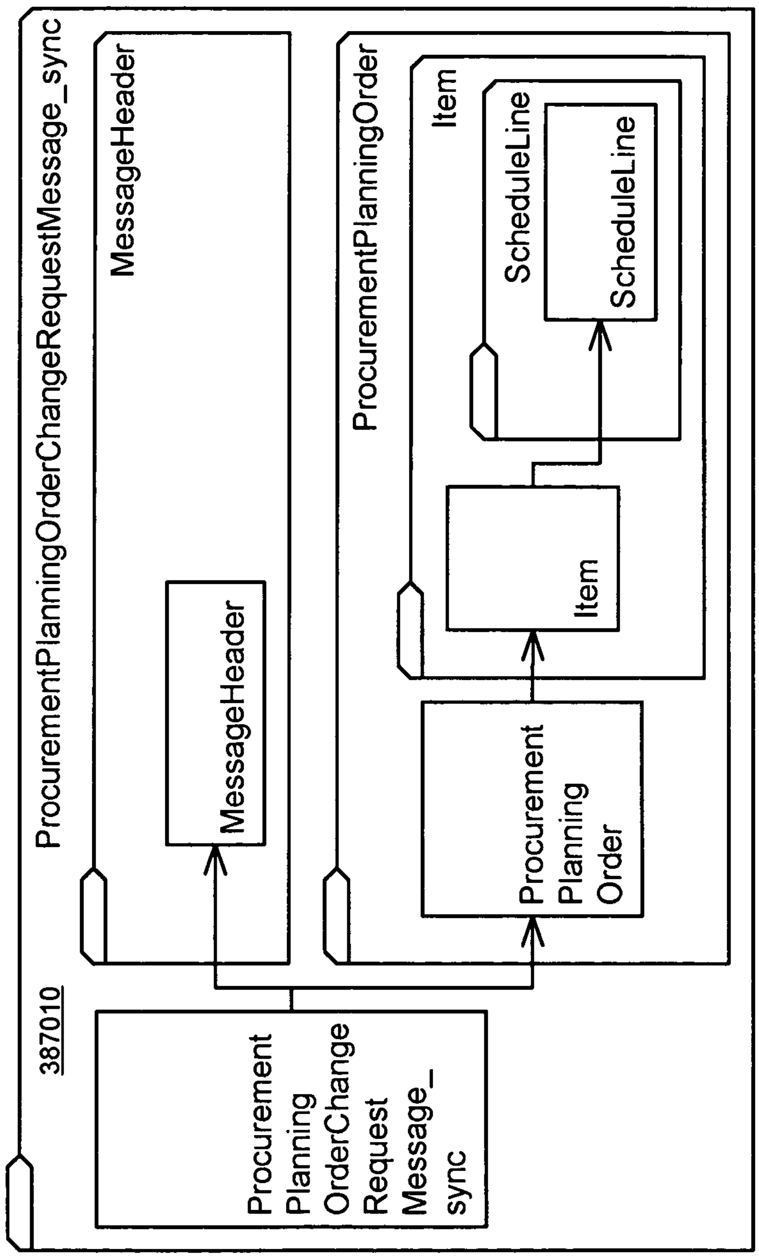
Figure 396:
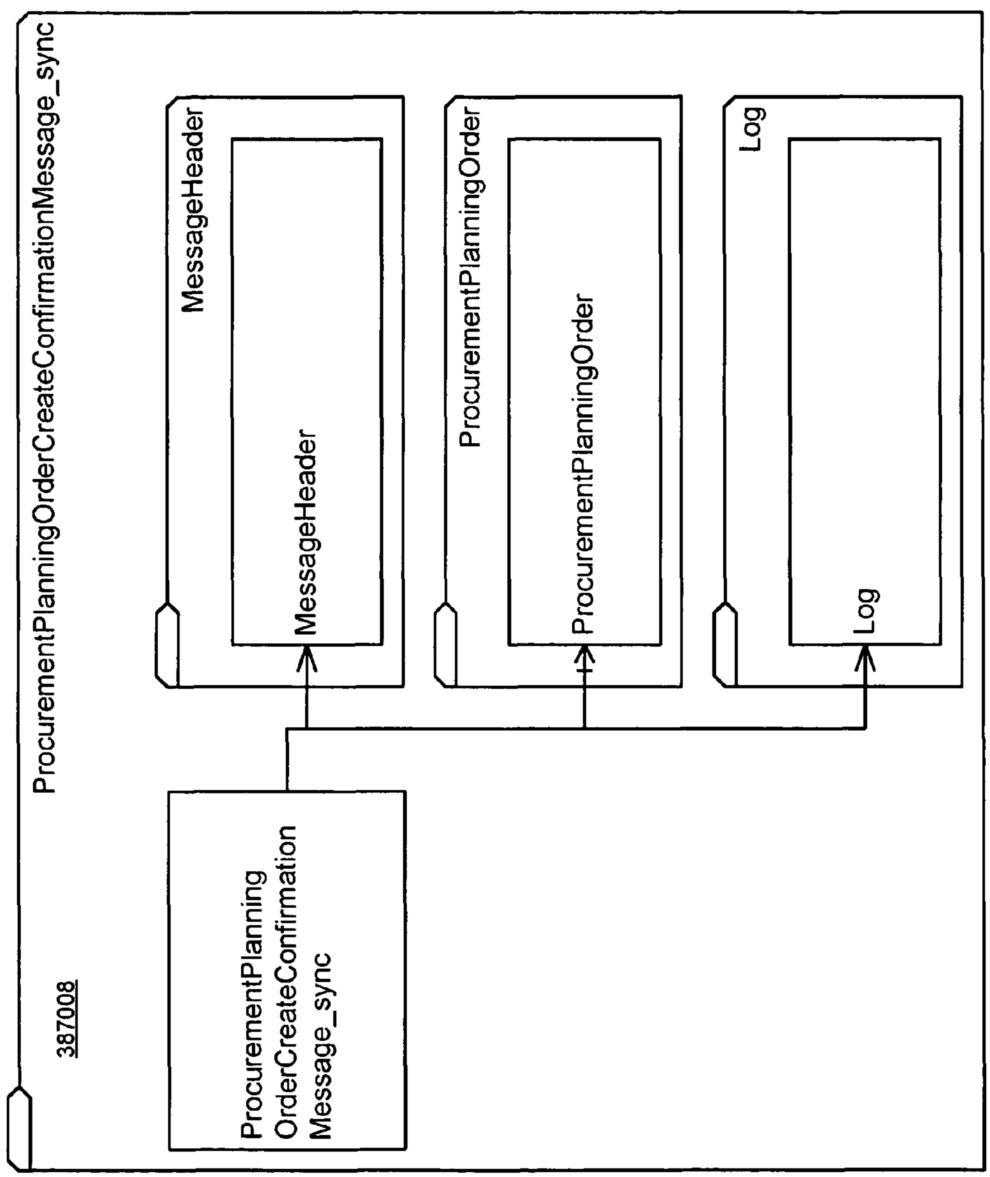
Figure 397:
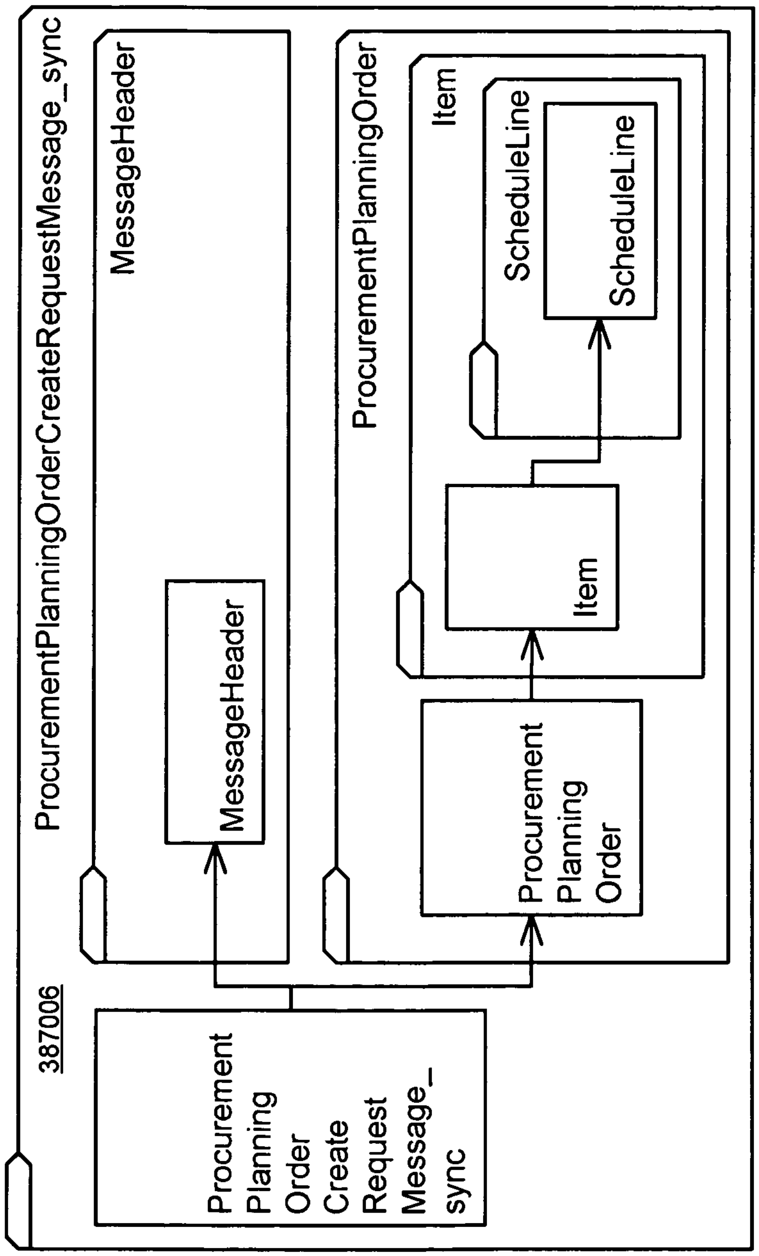
Figure 408:
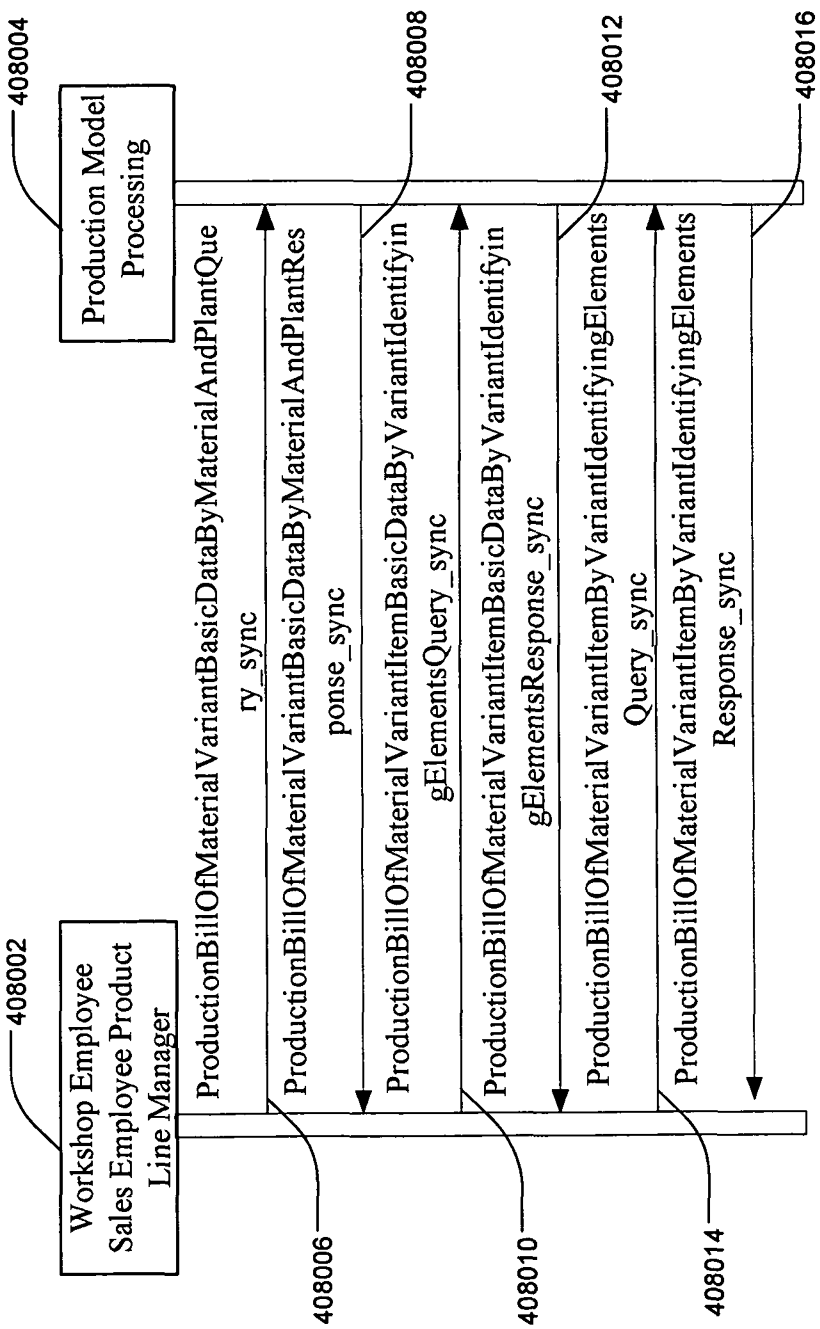
Figure 409:
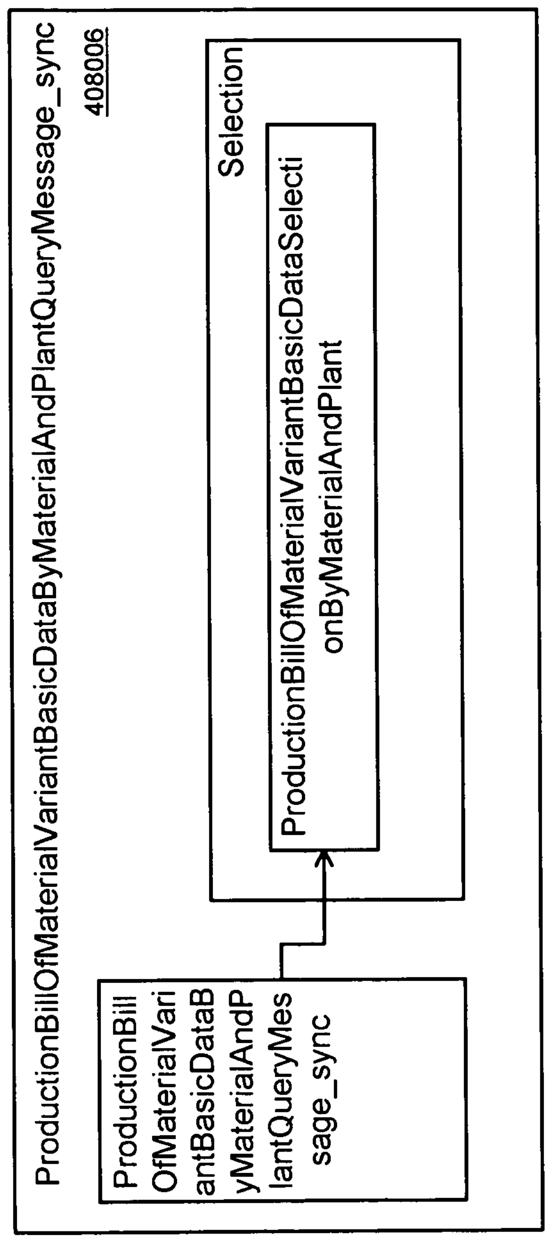
Figure 410:
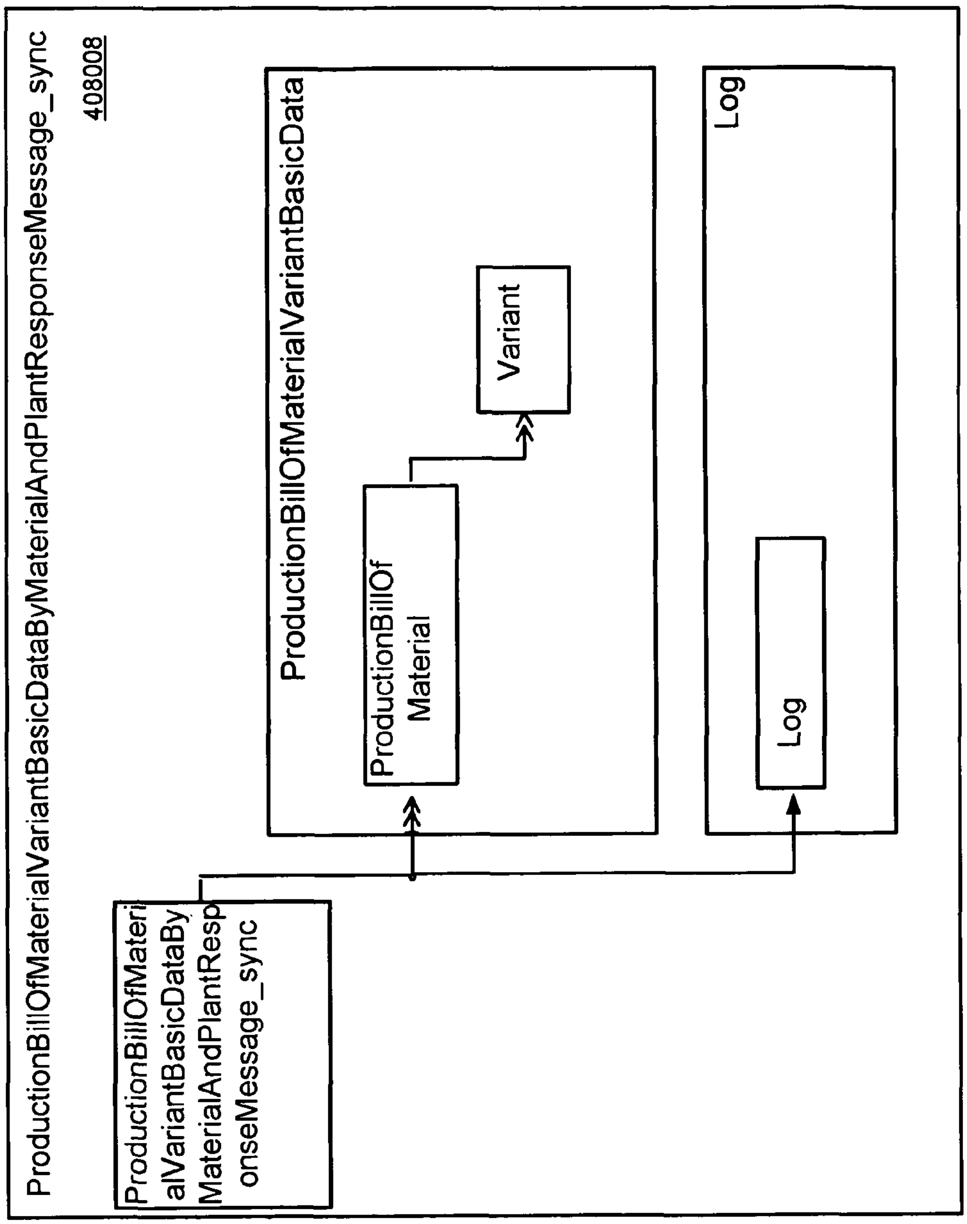
Figure 411:
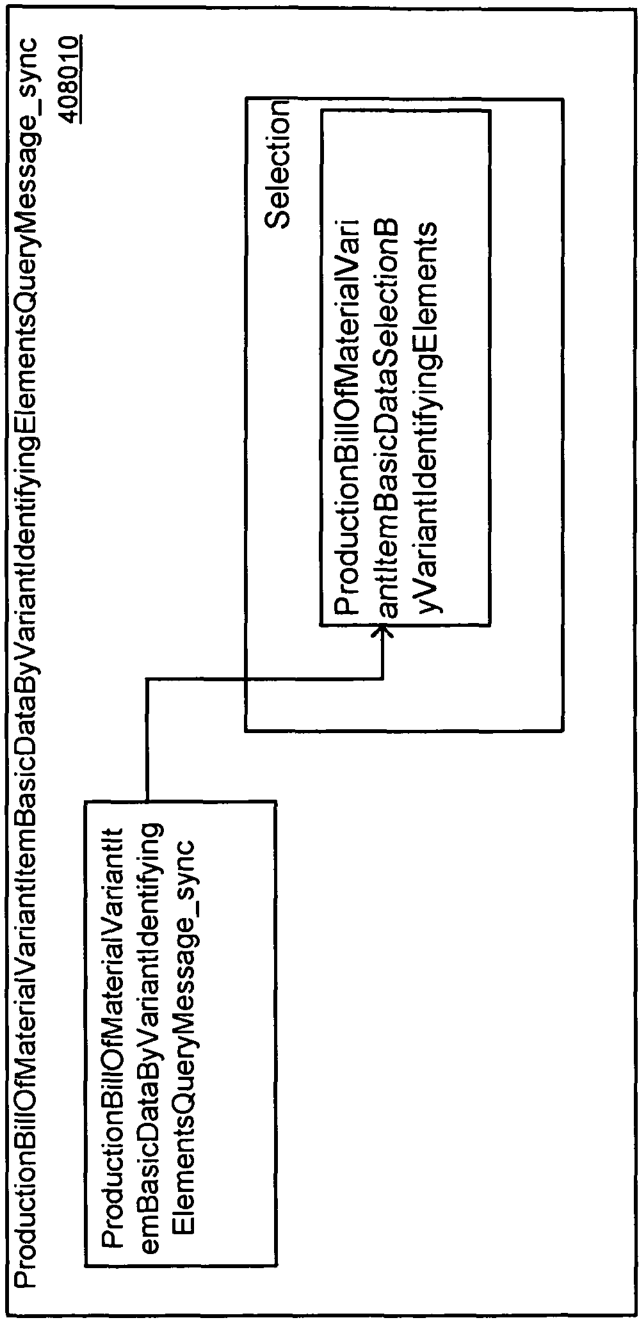
Figure 412:
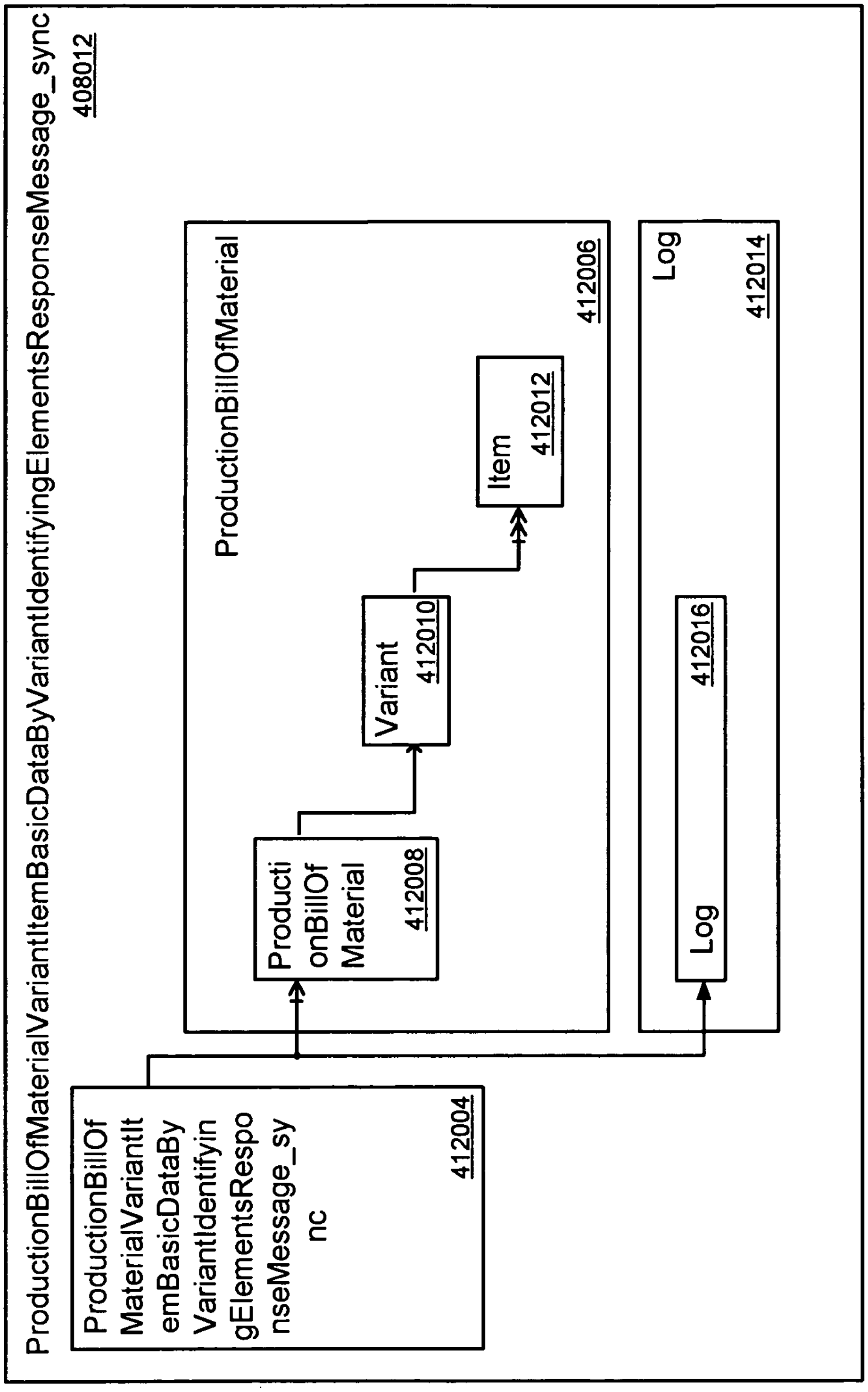
Figure 413:
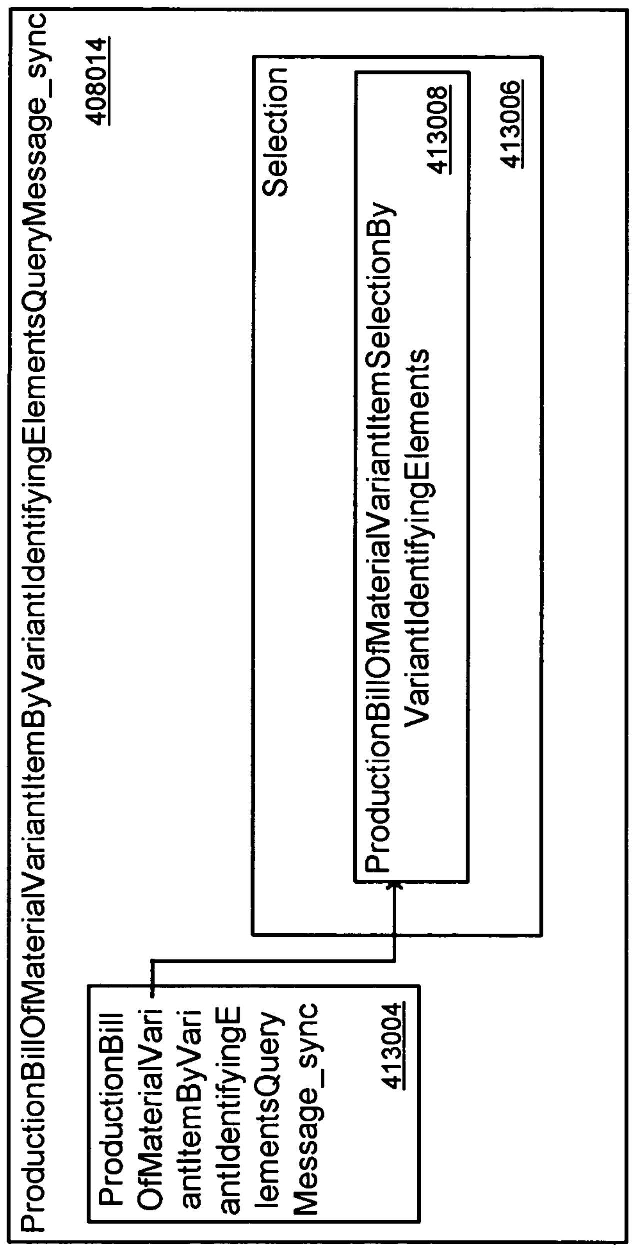
Figure 414:
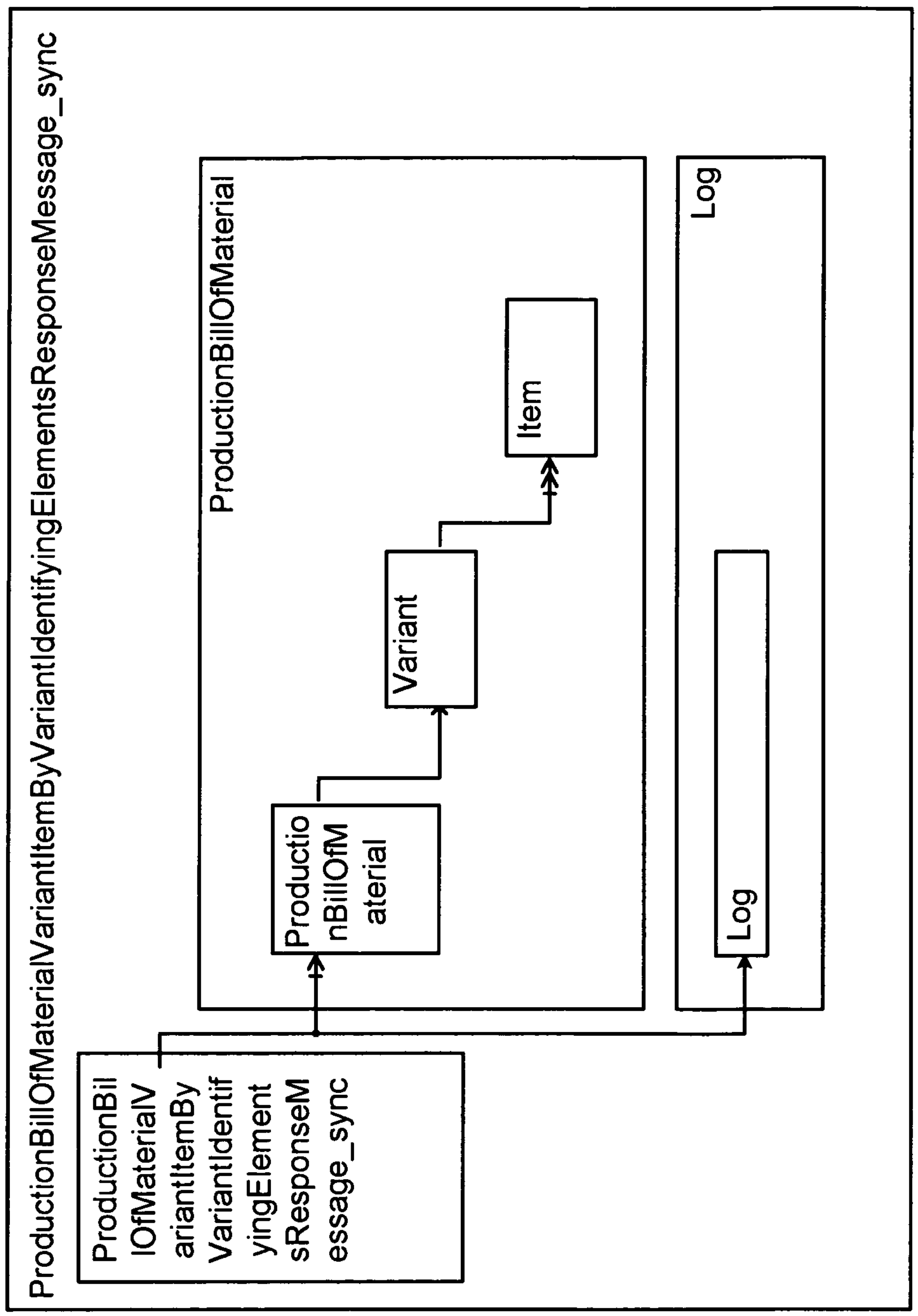
Figure 419:
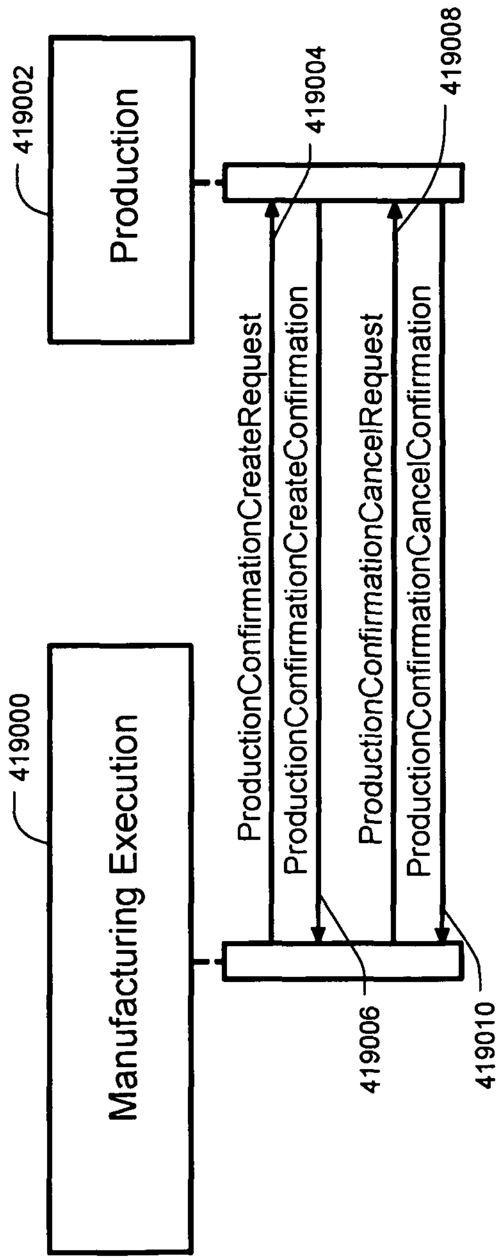
Figure 420:
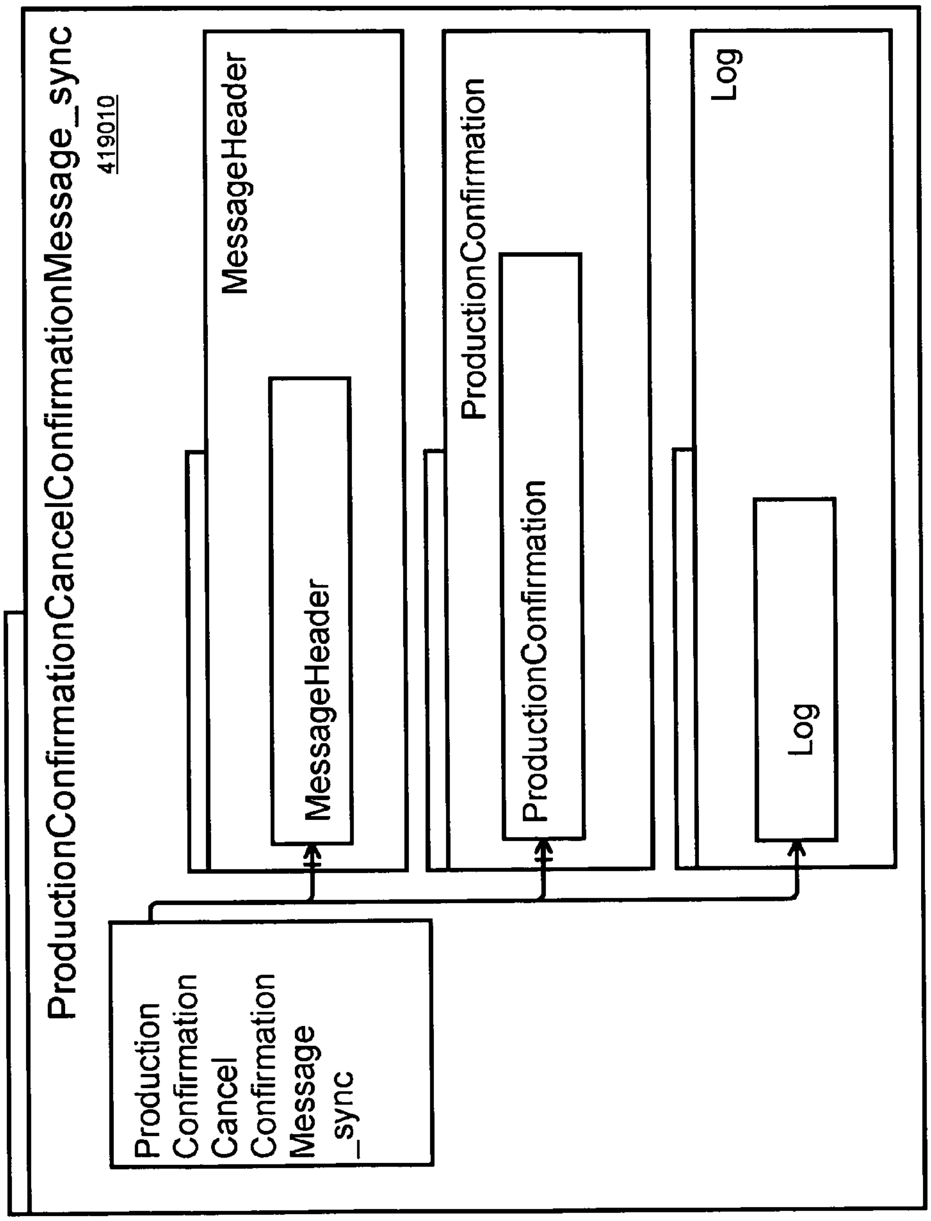
Figure 421:
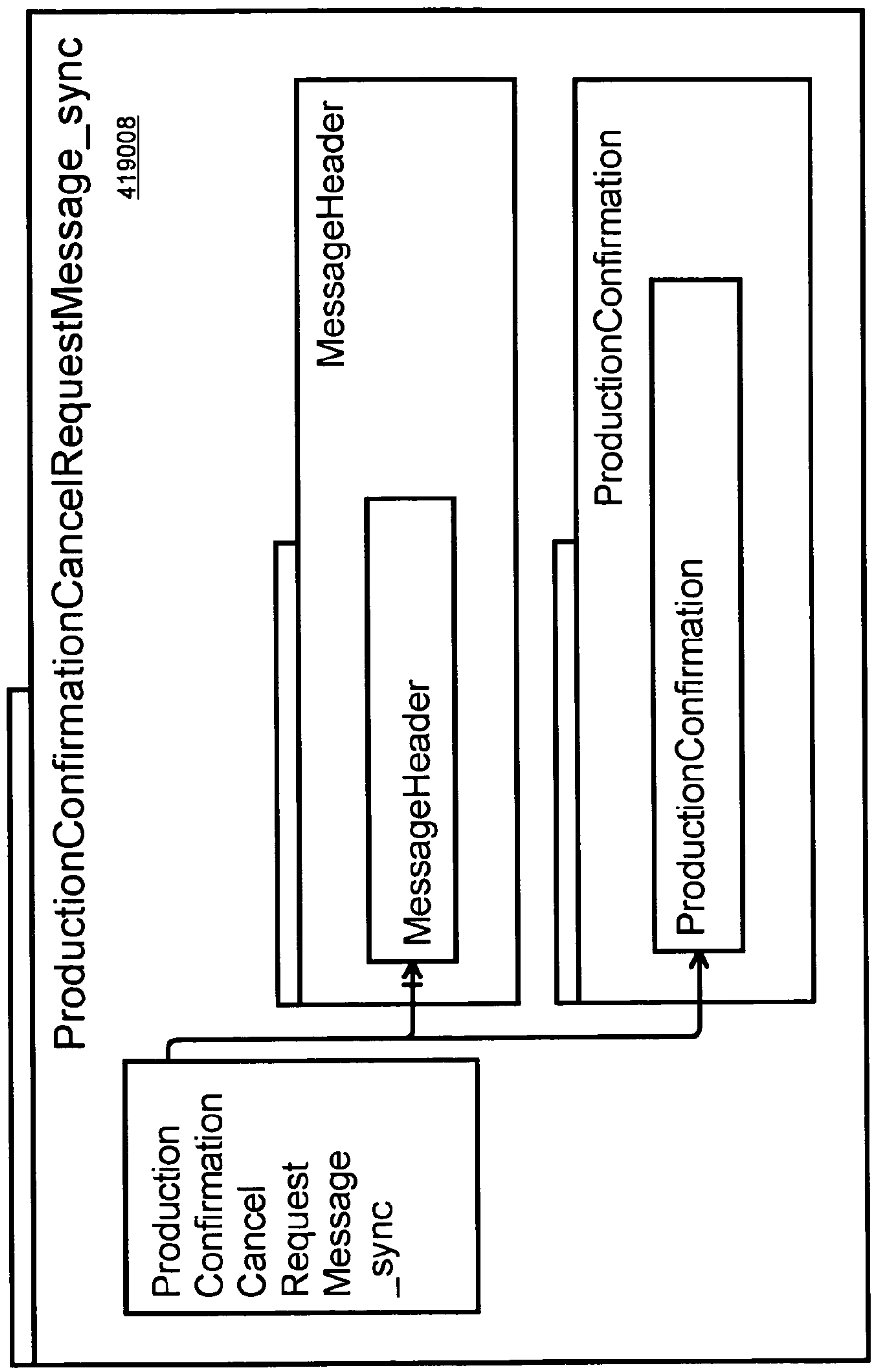
Figure 422:
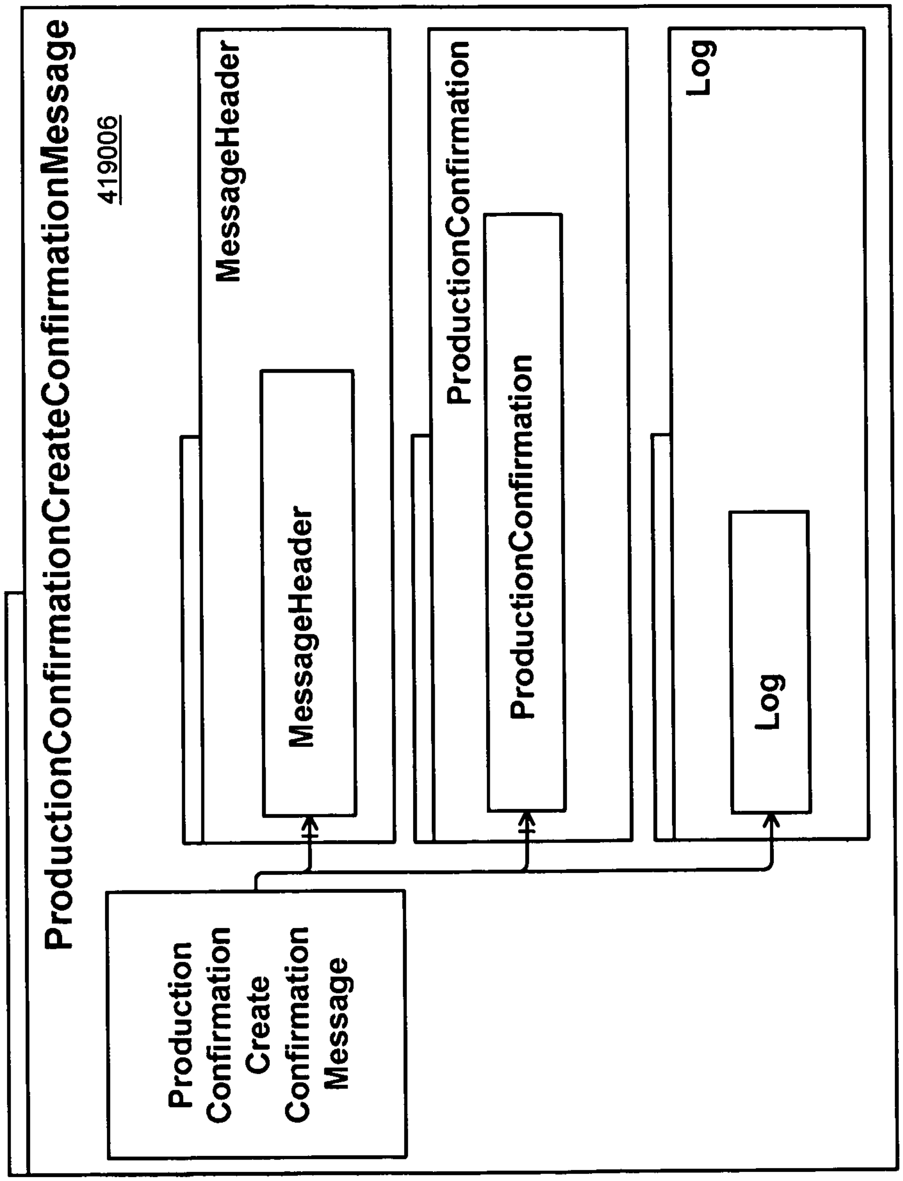
Figure 423:
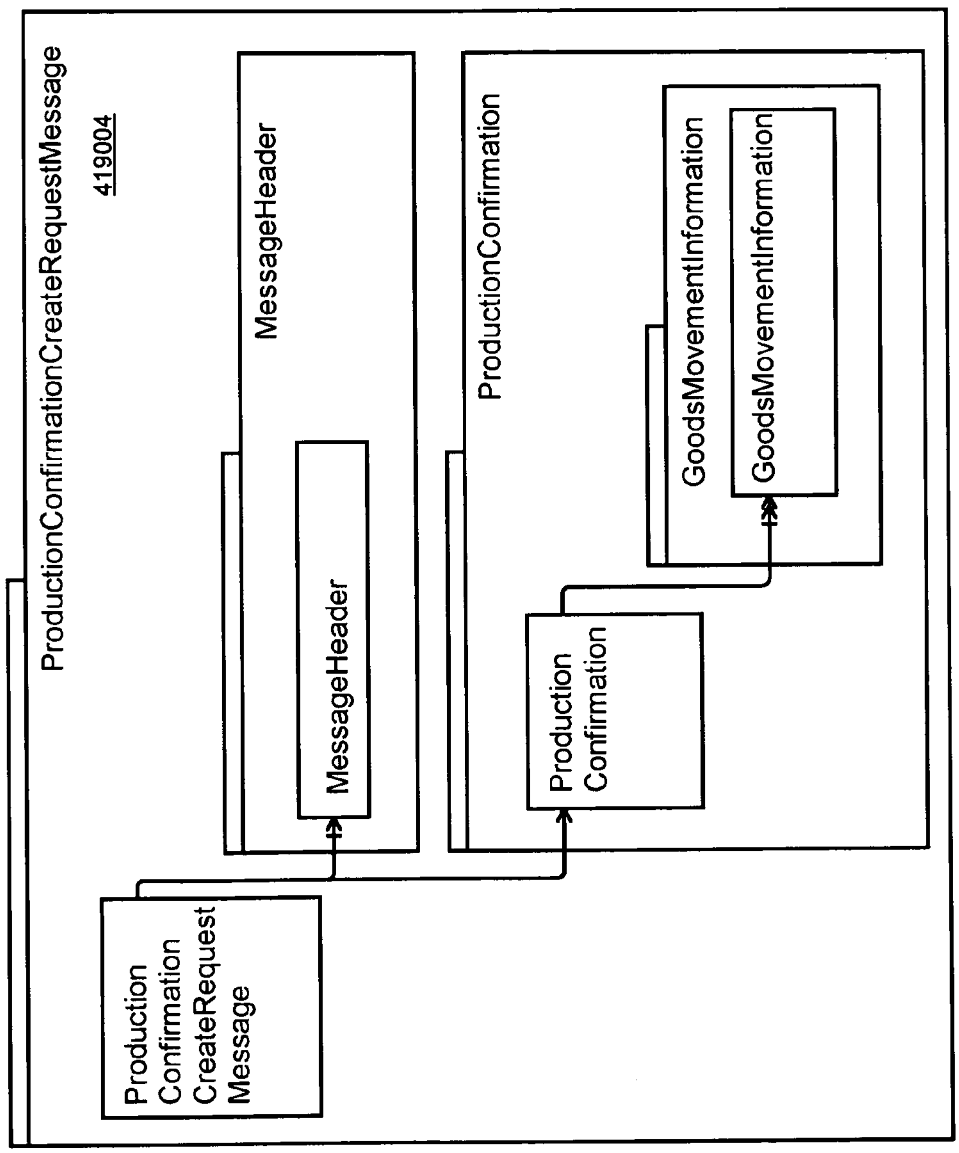
Figure 430:
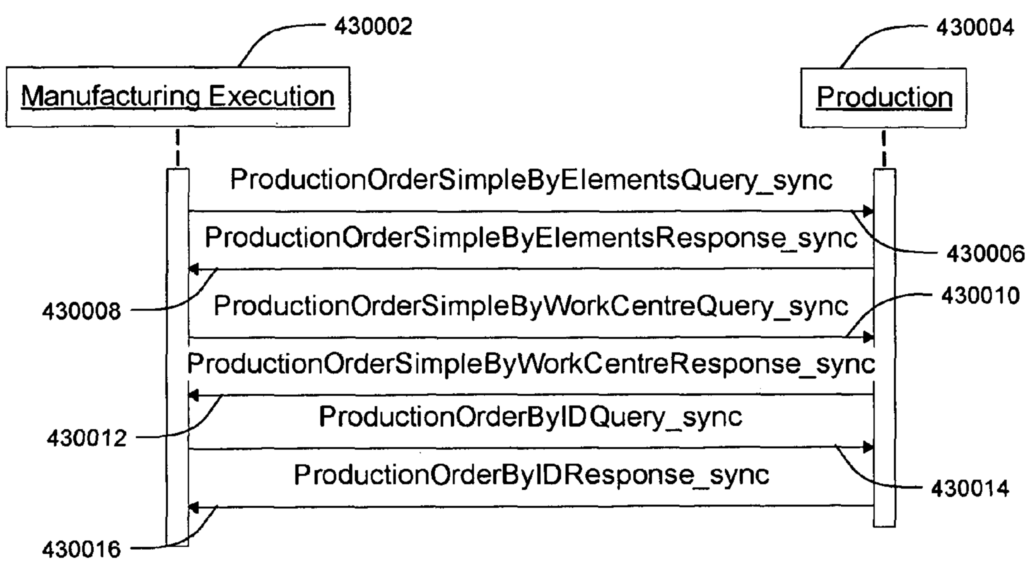
Figure 431:
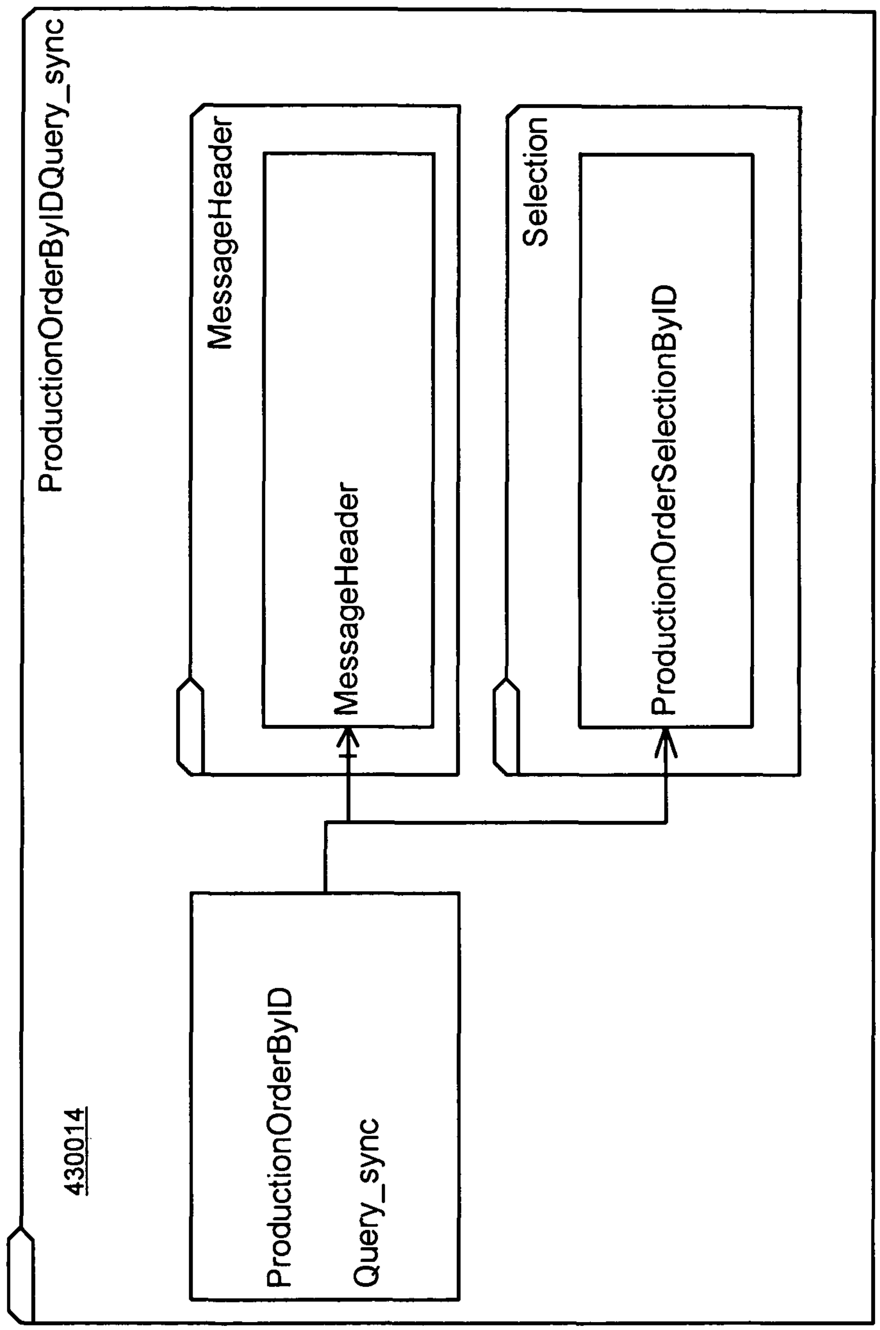
Figure 432:
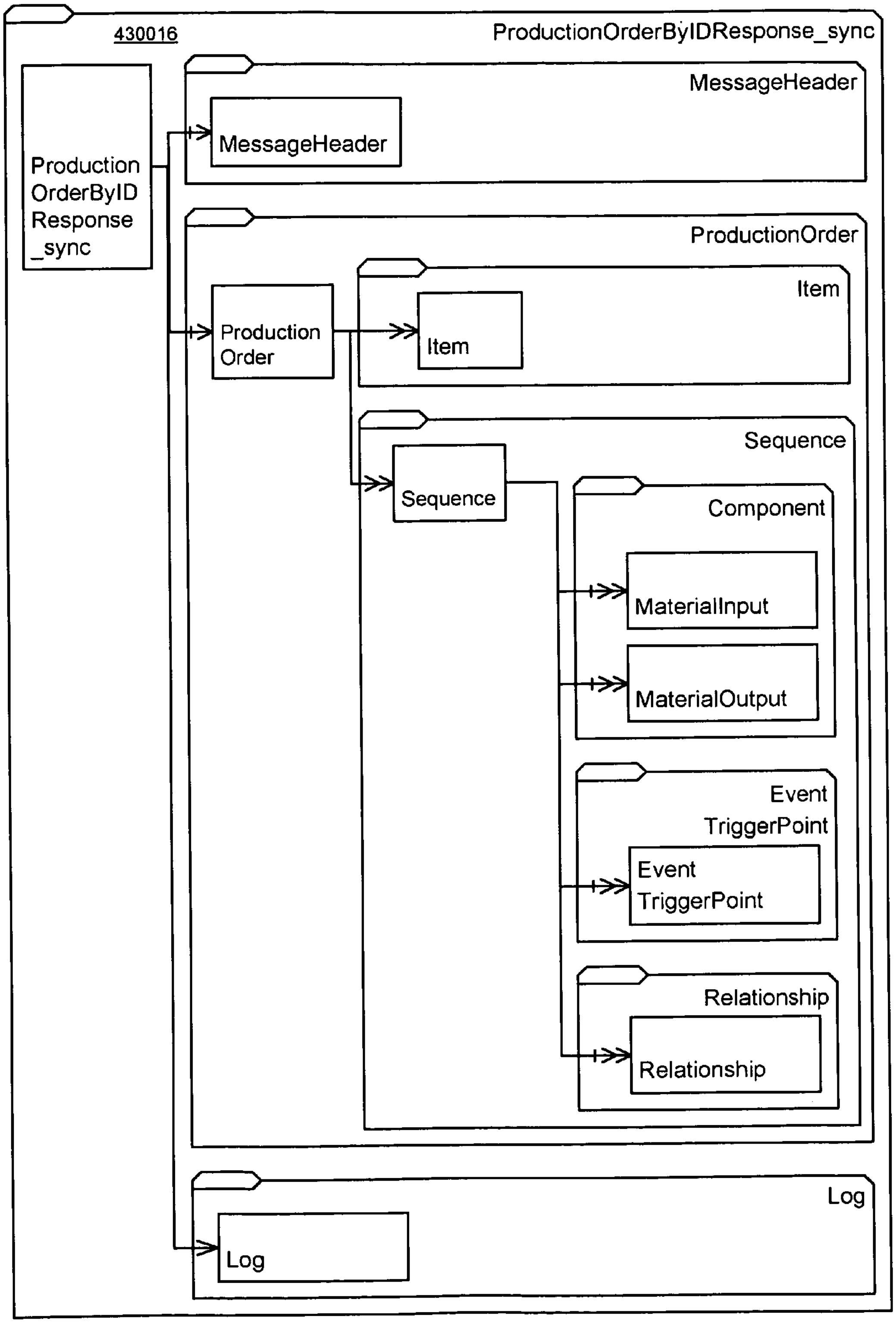
Figure 433:
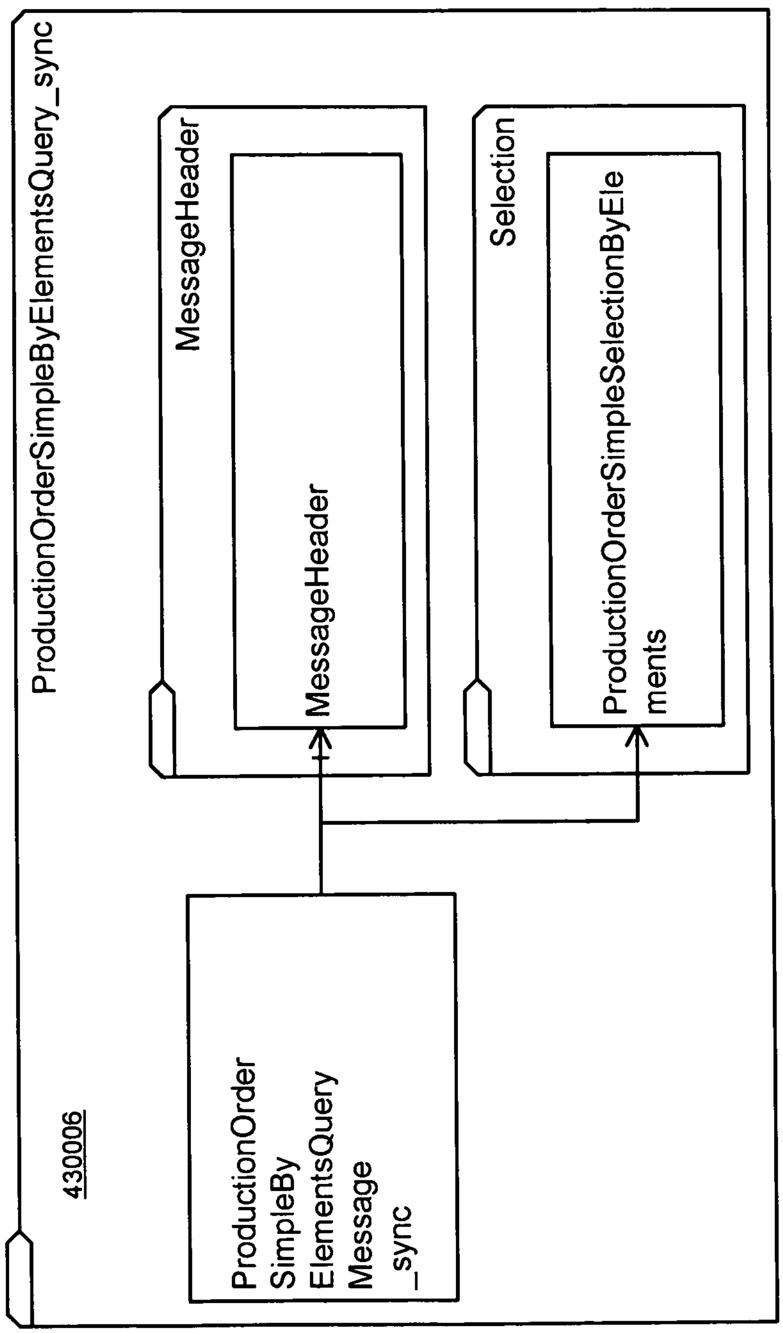
Figure 434:
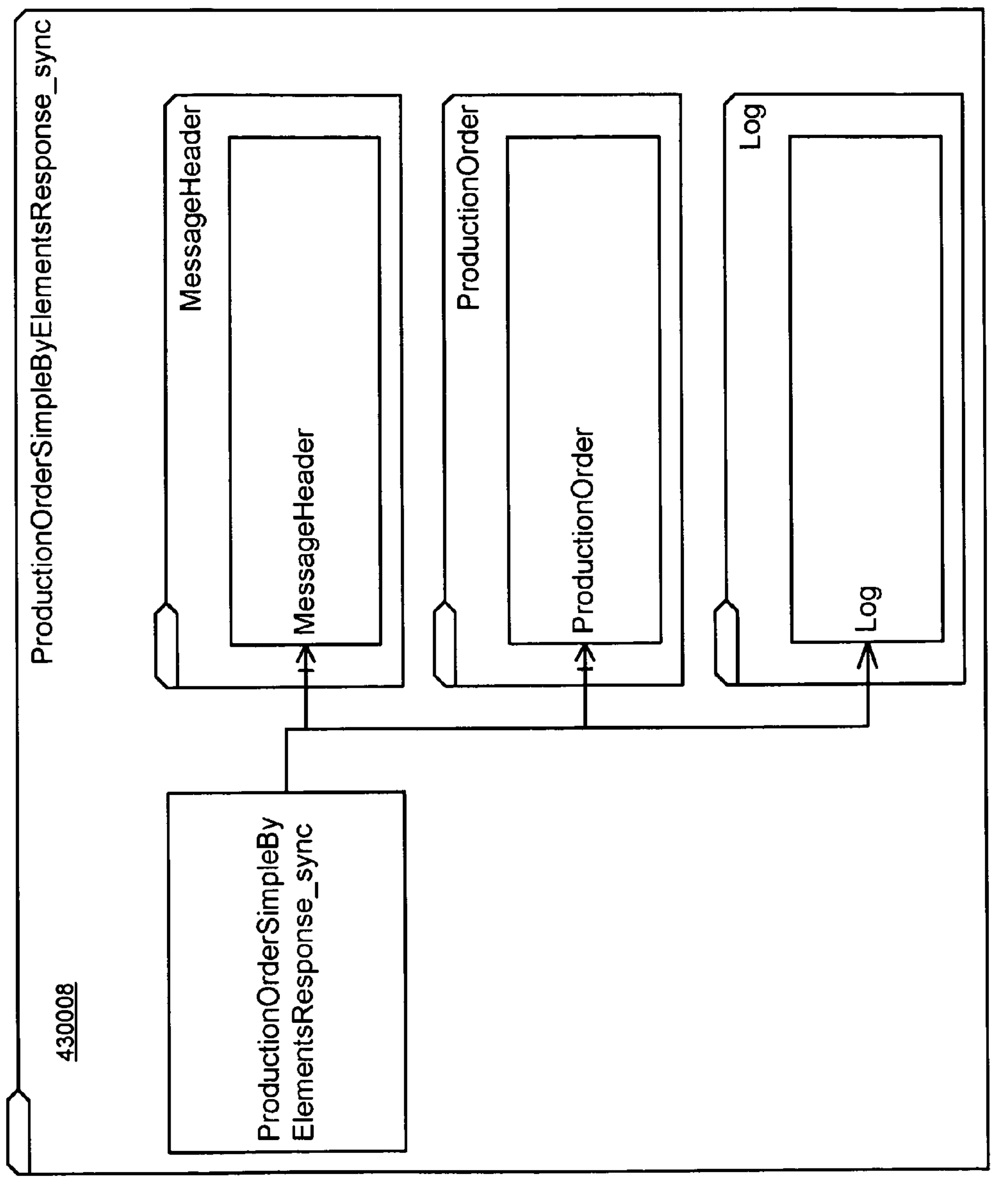
Figure 435:
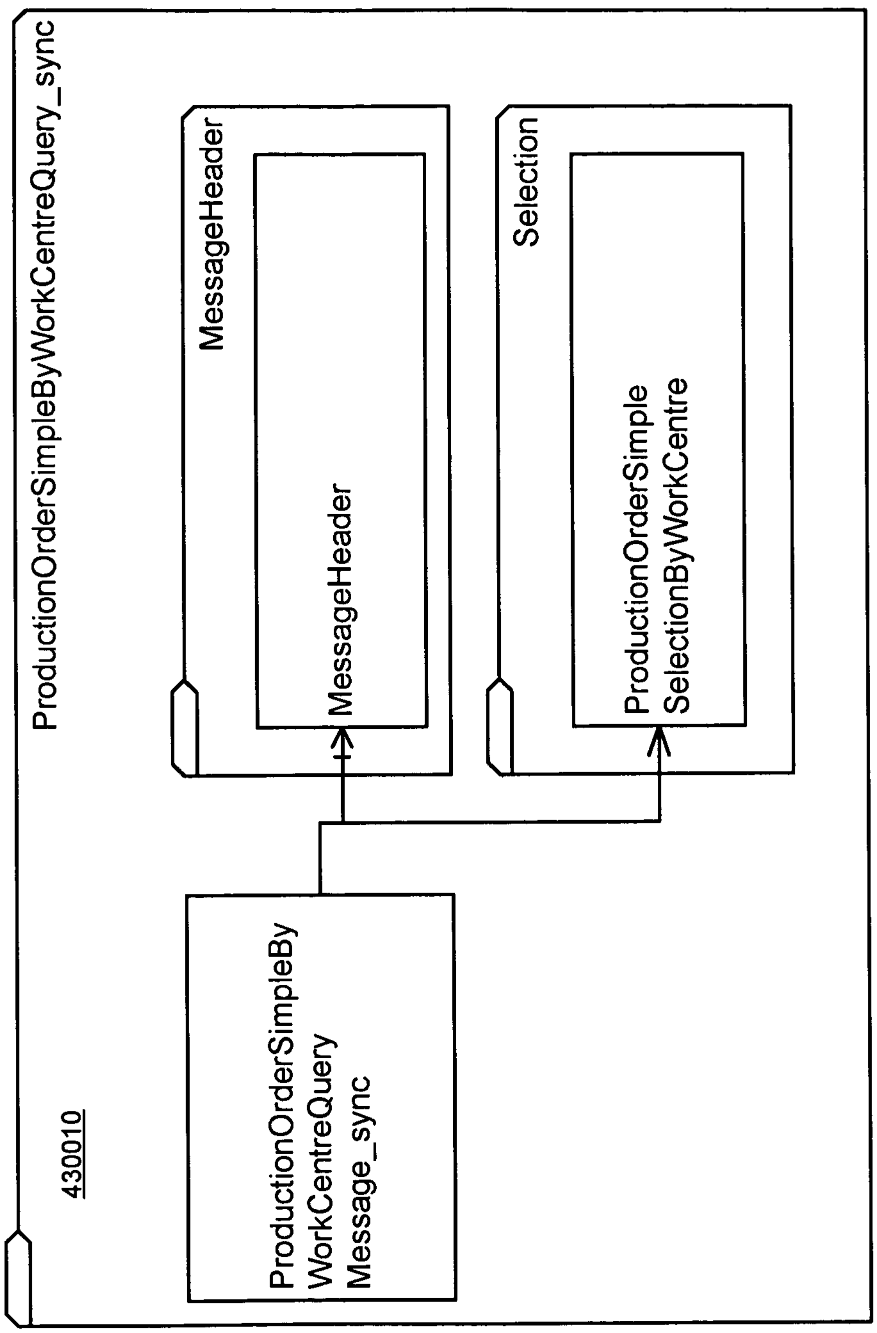
Figure 436:
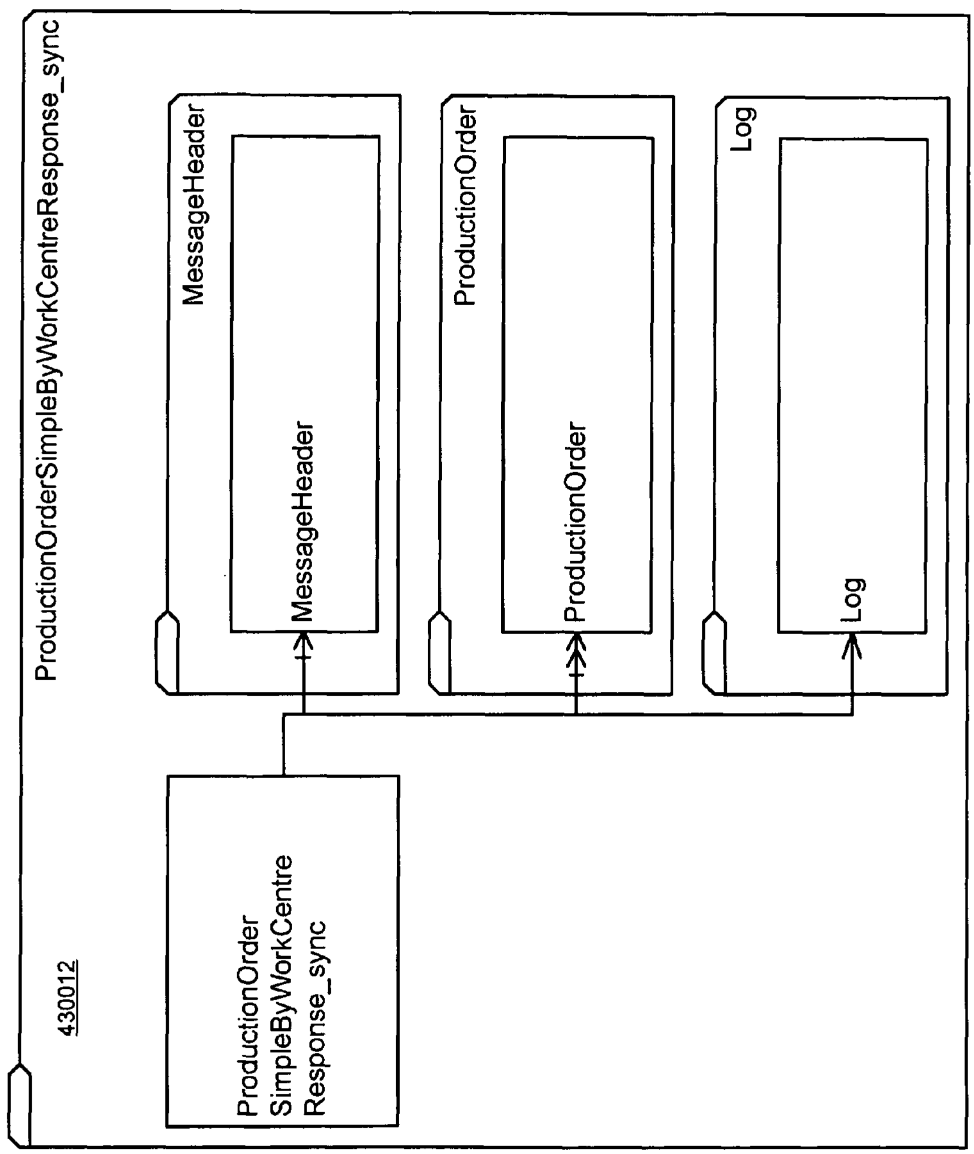
Figure 443:
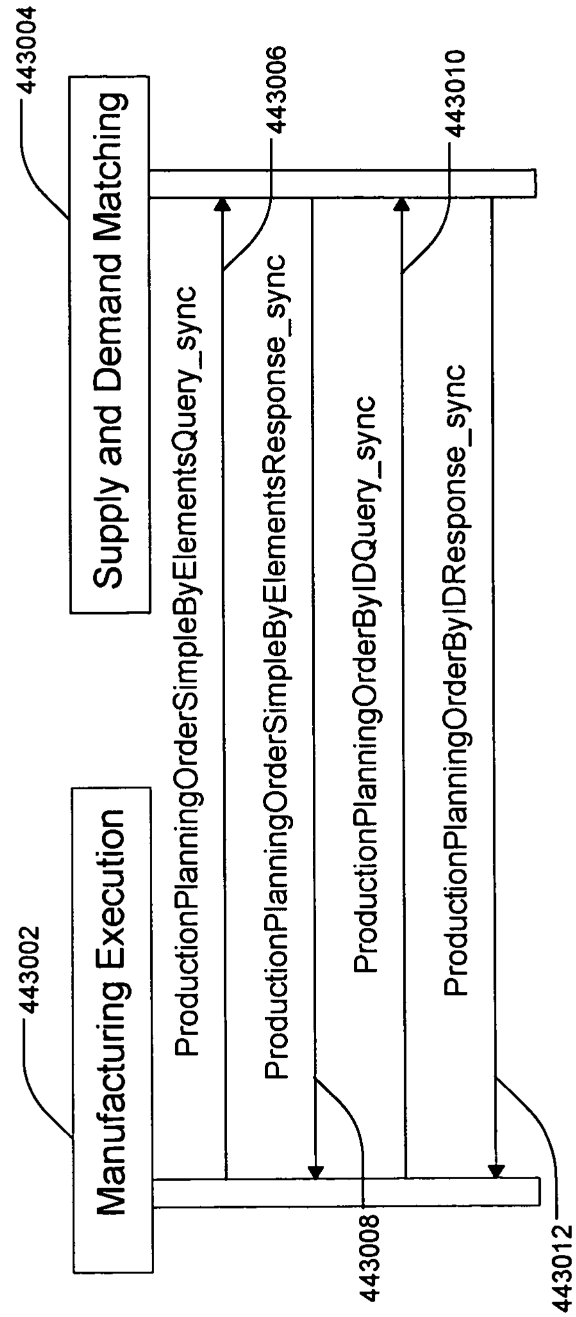
Figure 444:
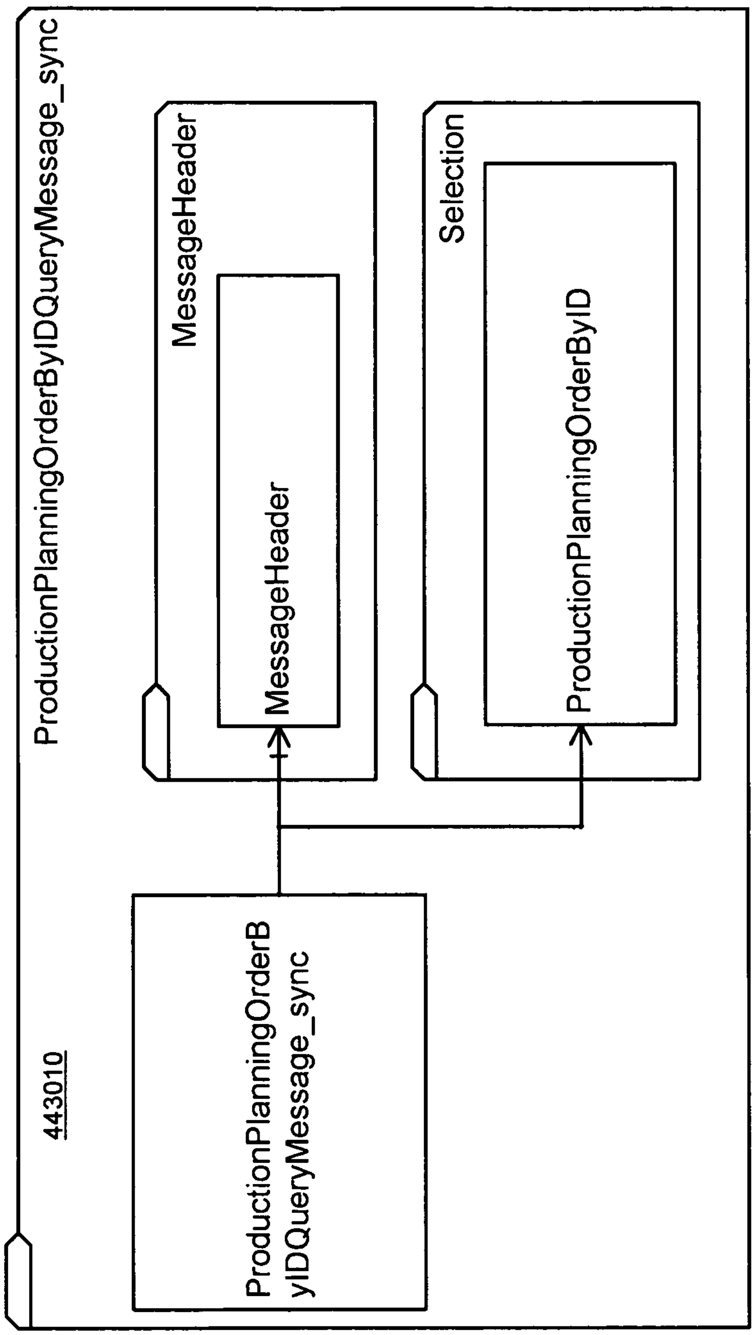
Figure 445:
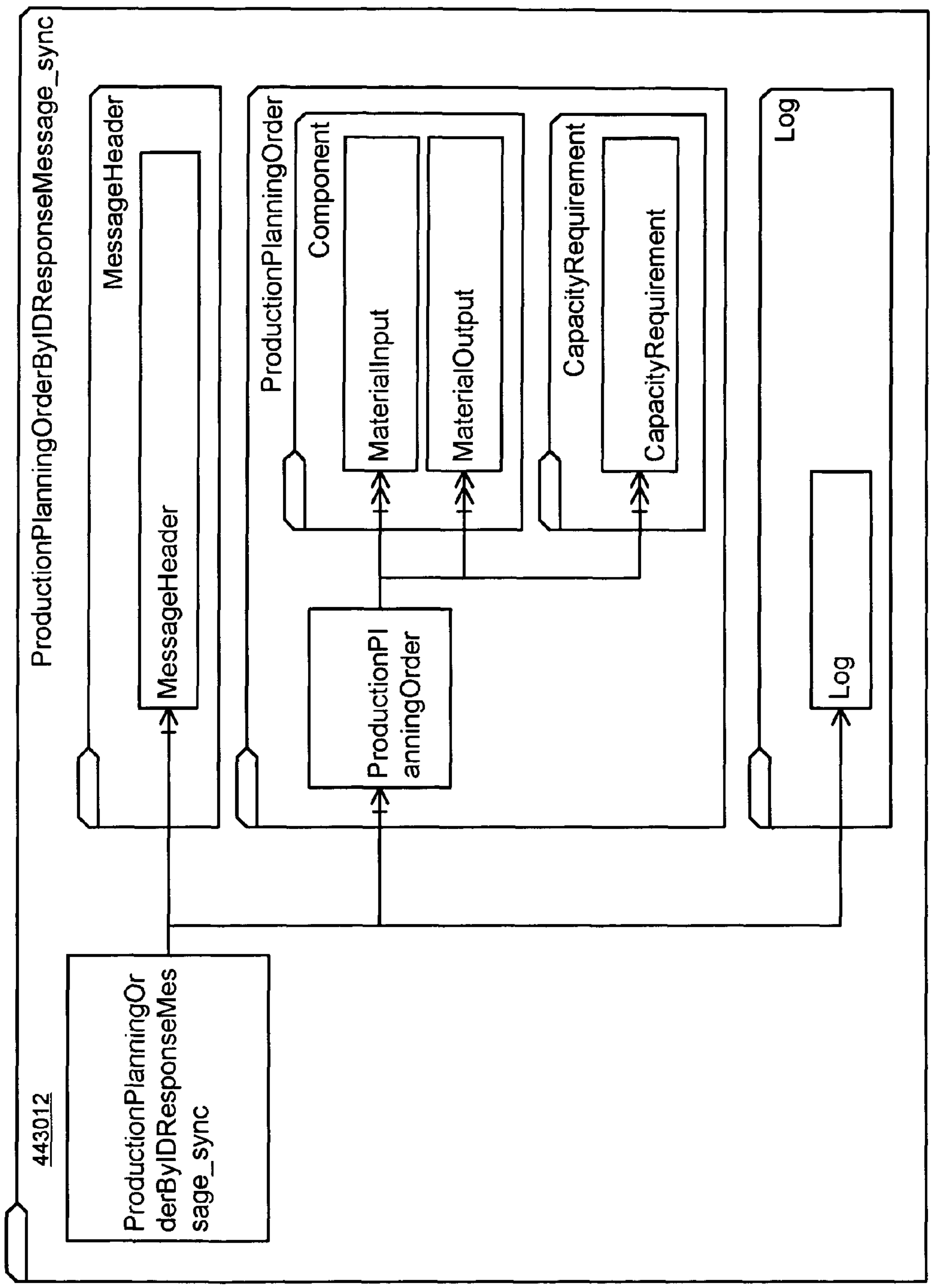
Figure 446:
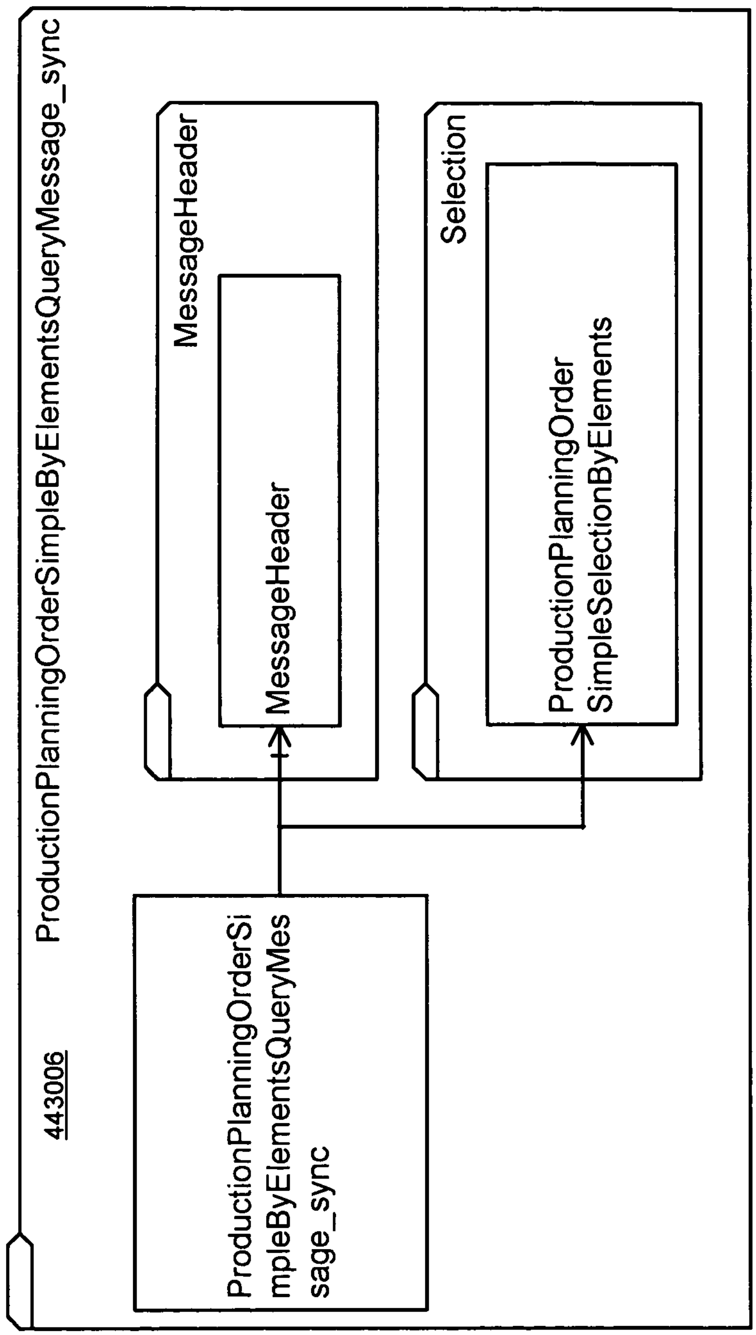
Figure 447:
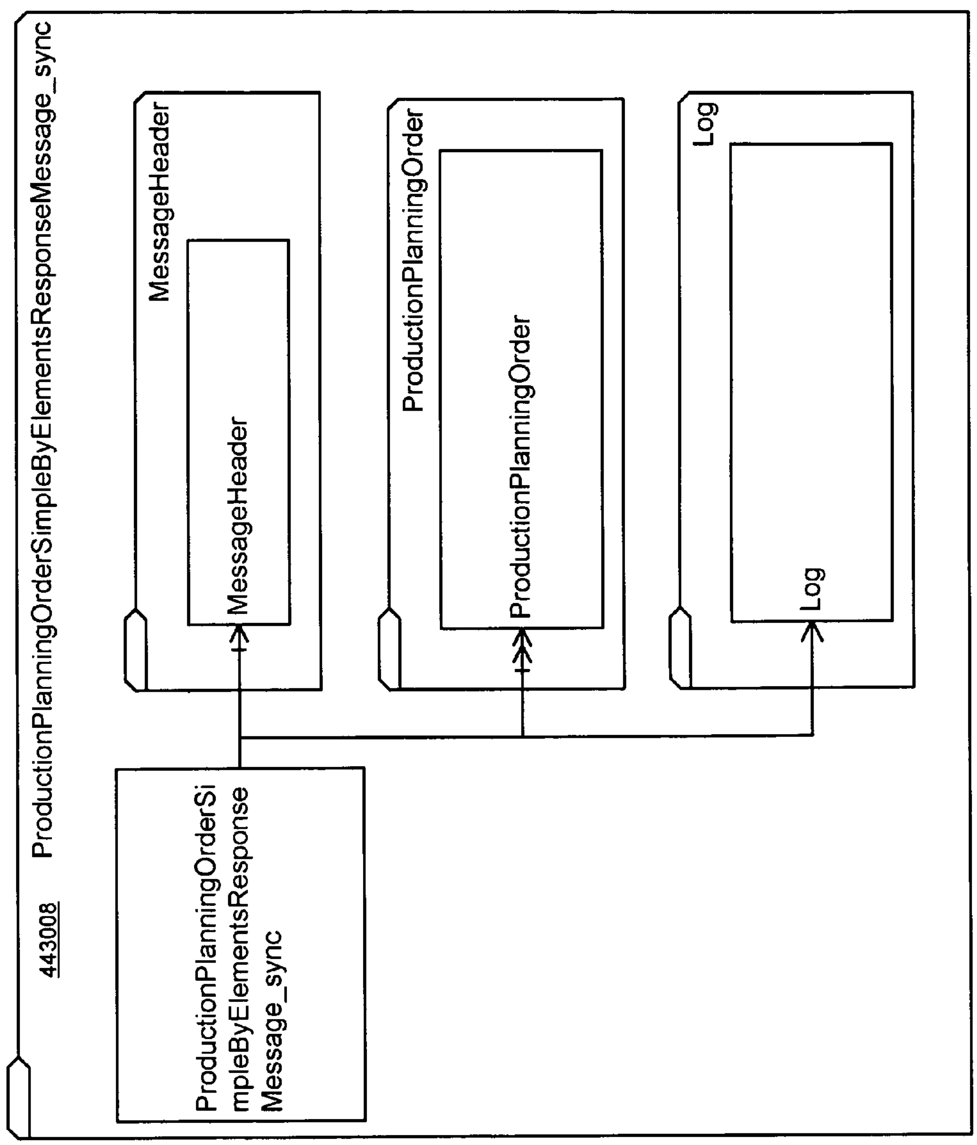
Figure 452:
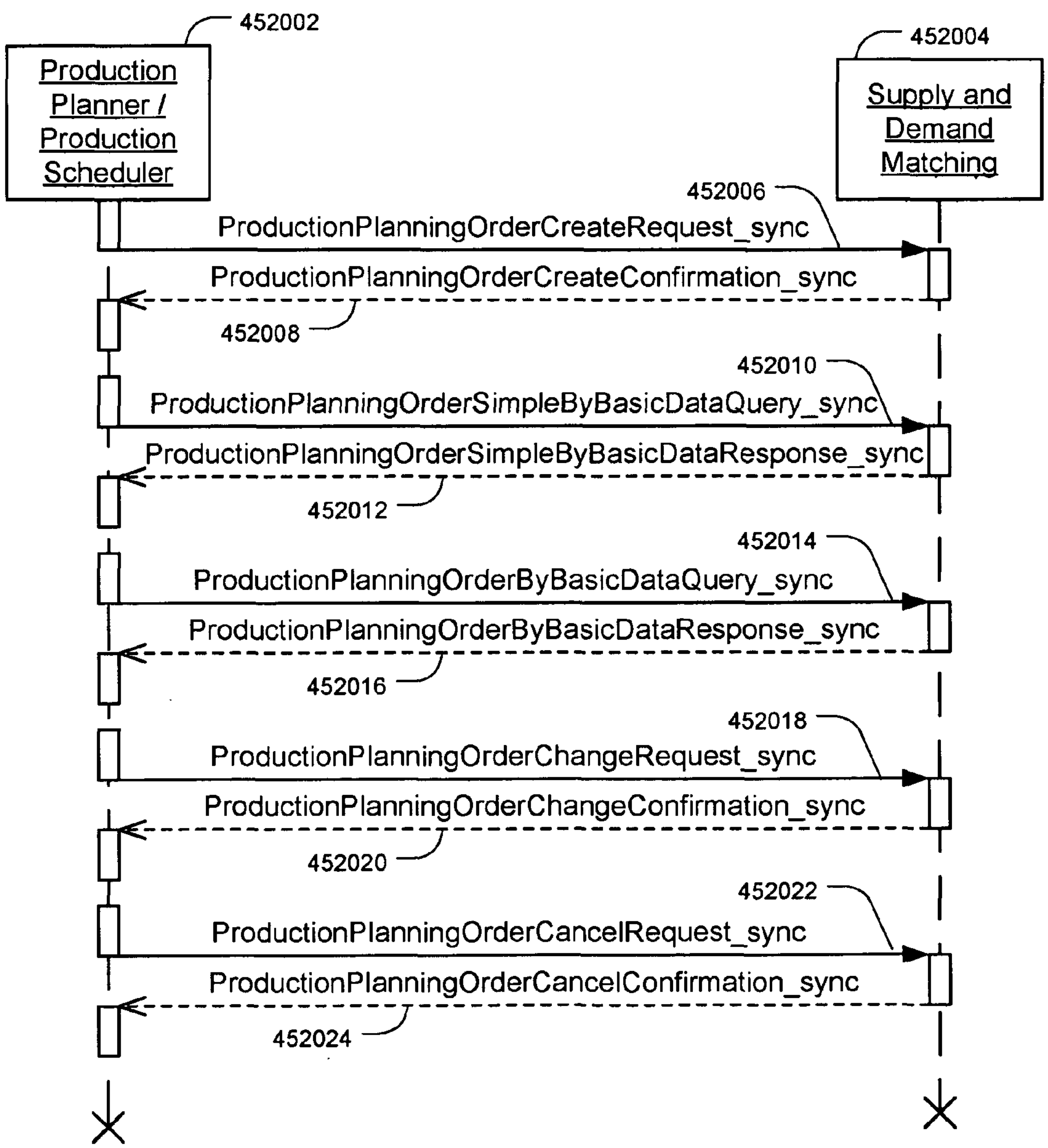
Figure 453:
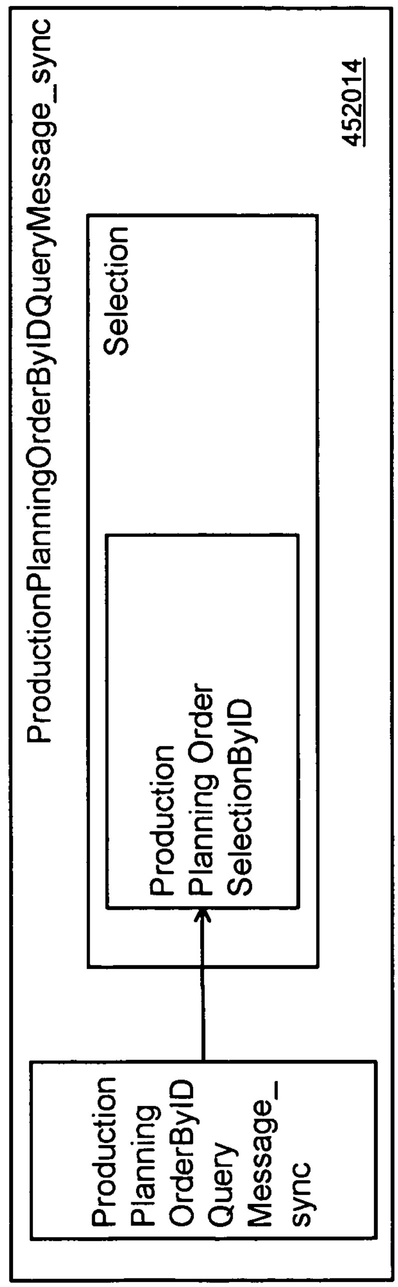
Figure 454:
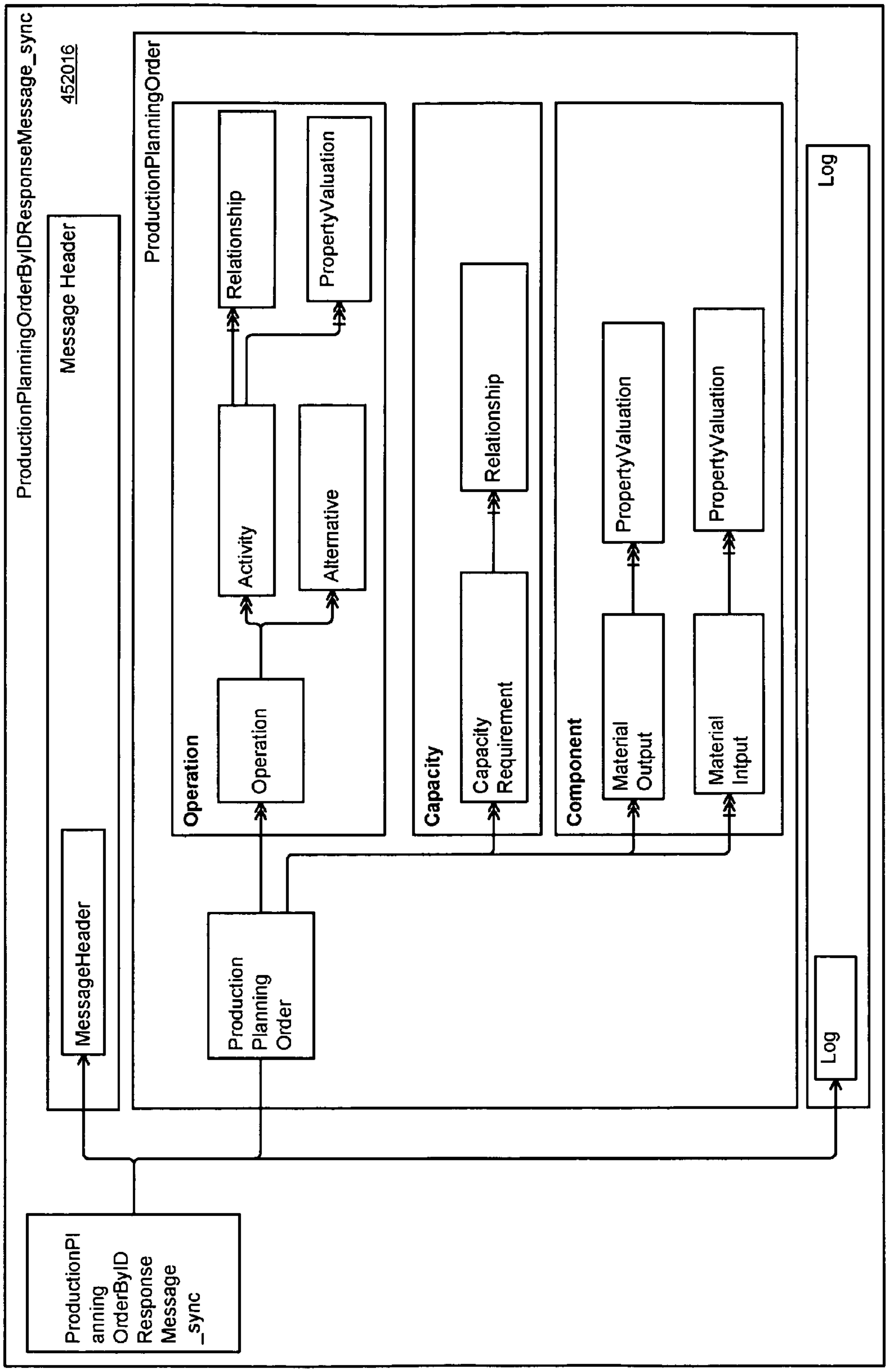
Figure 455:
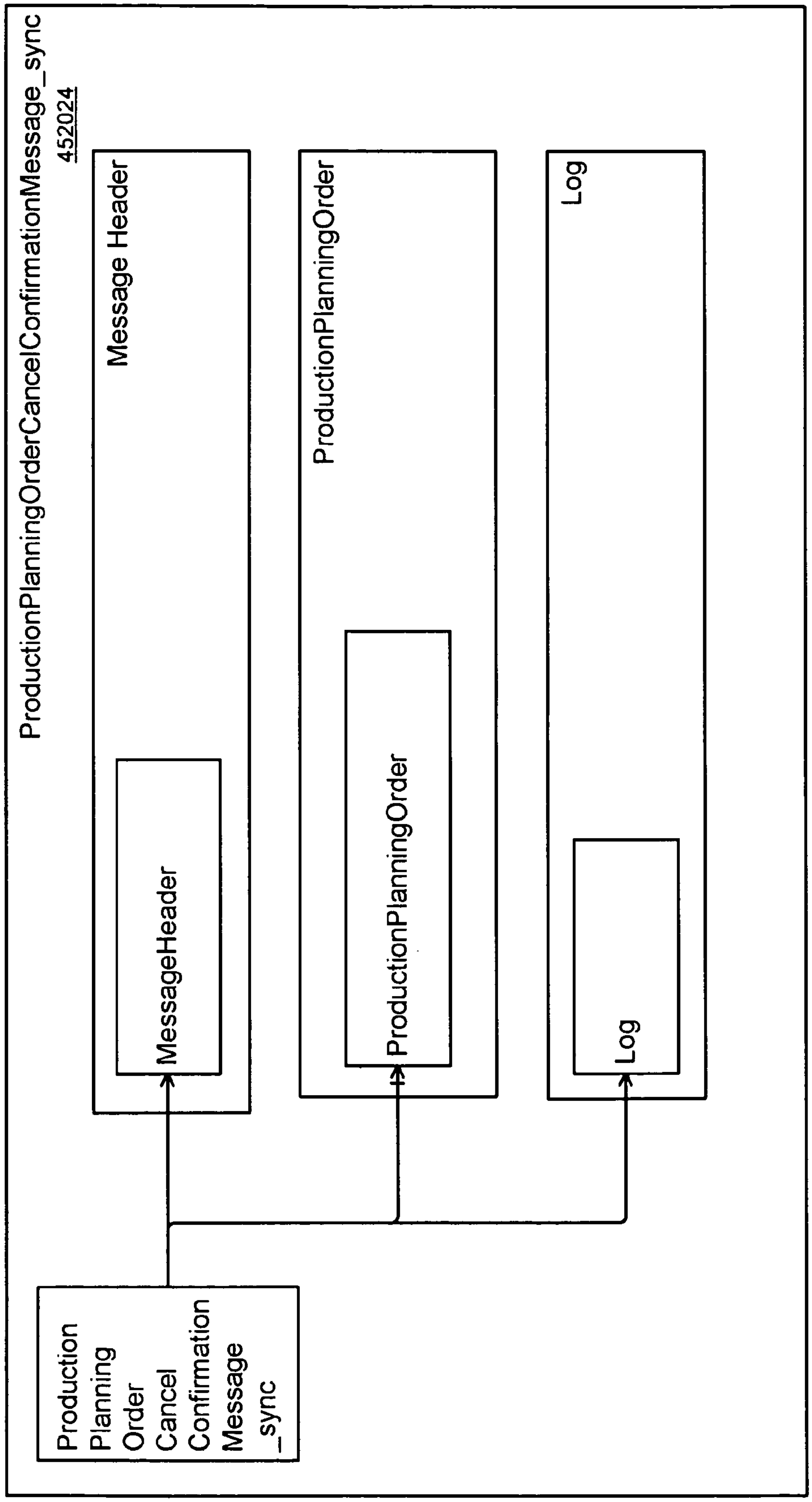
Figure 456:
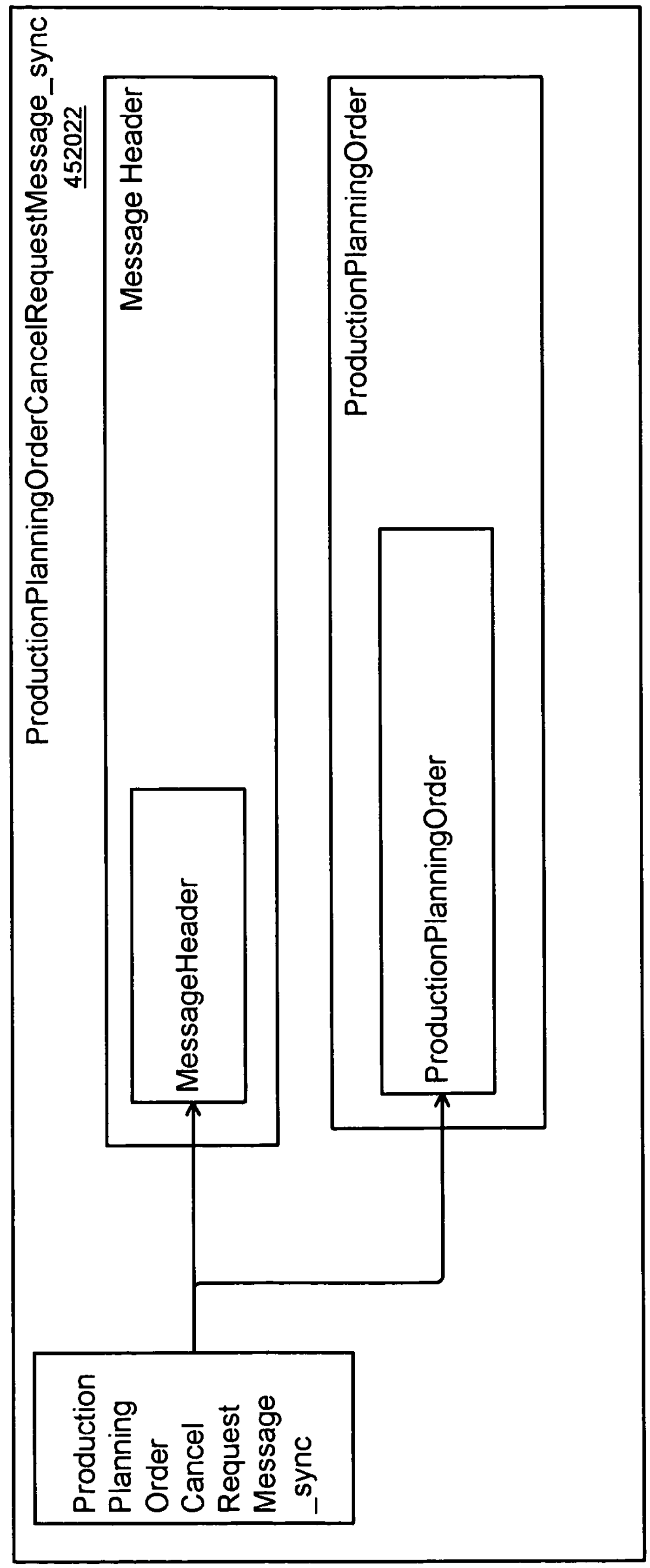
Figure 457:
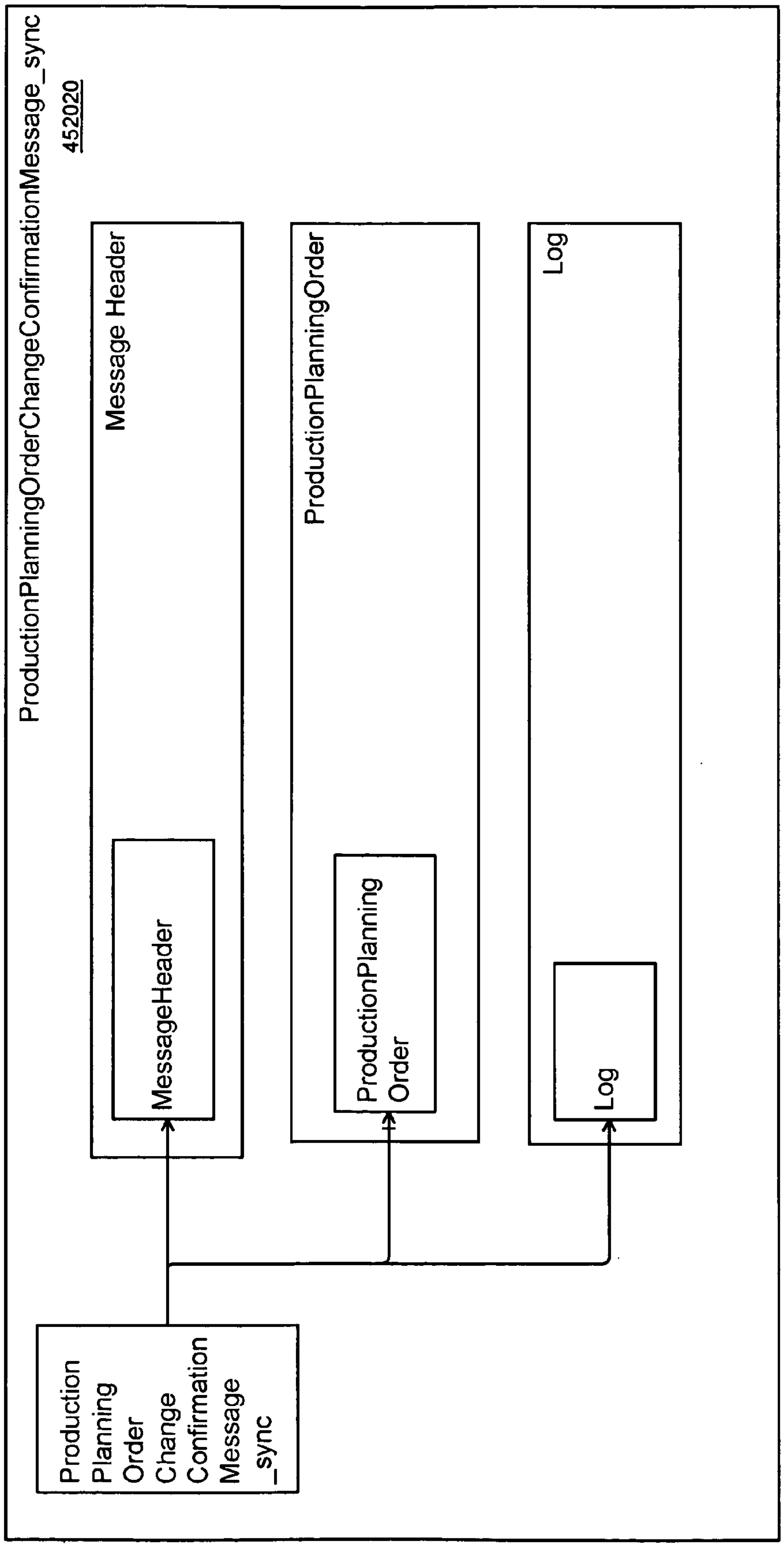
Figure 458:
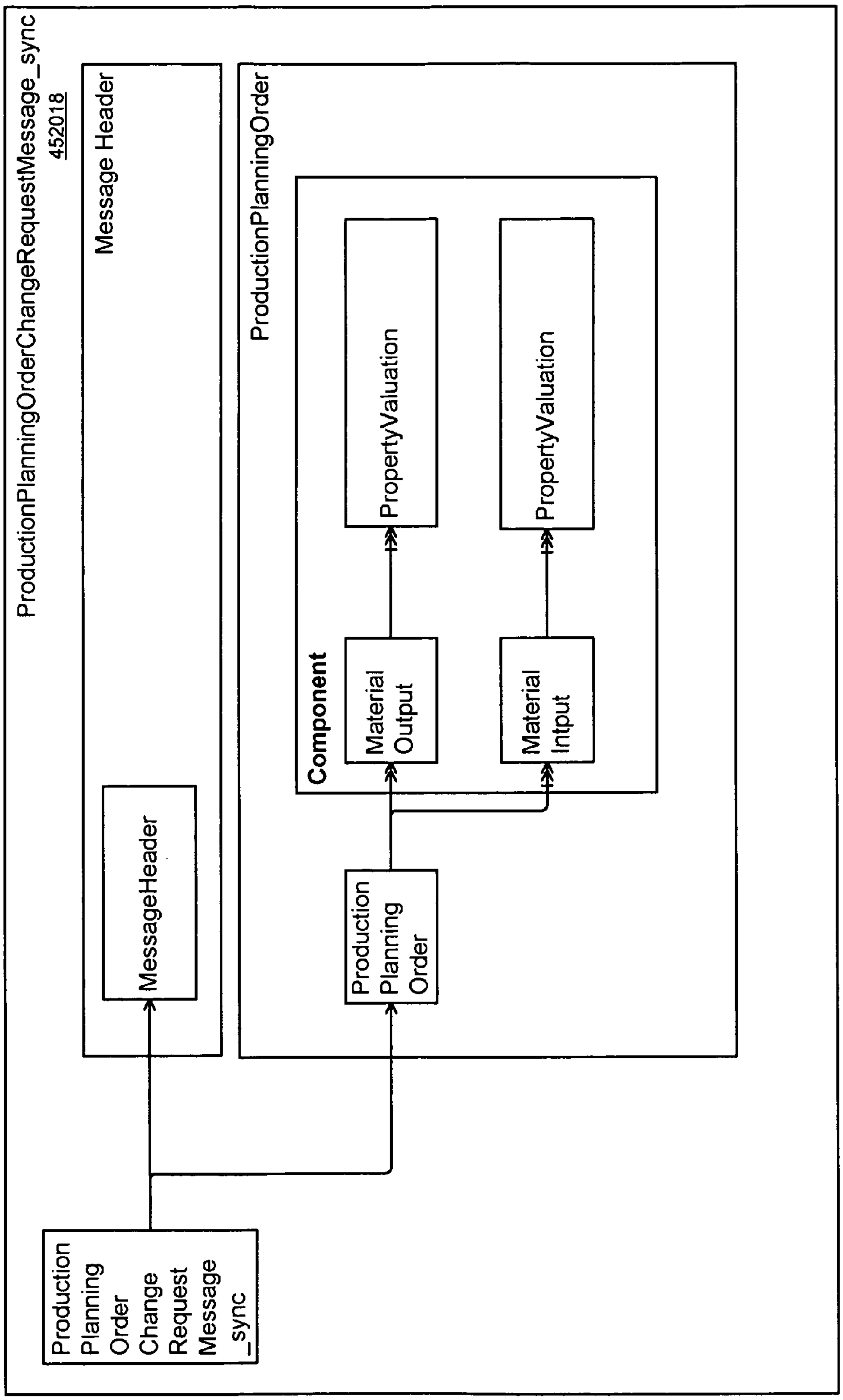
Figure 459:
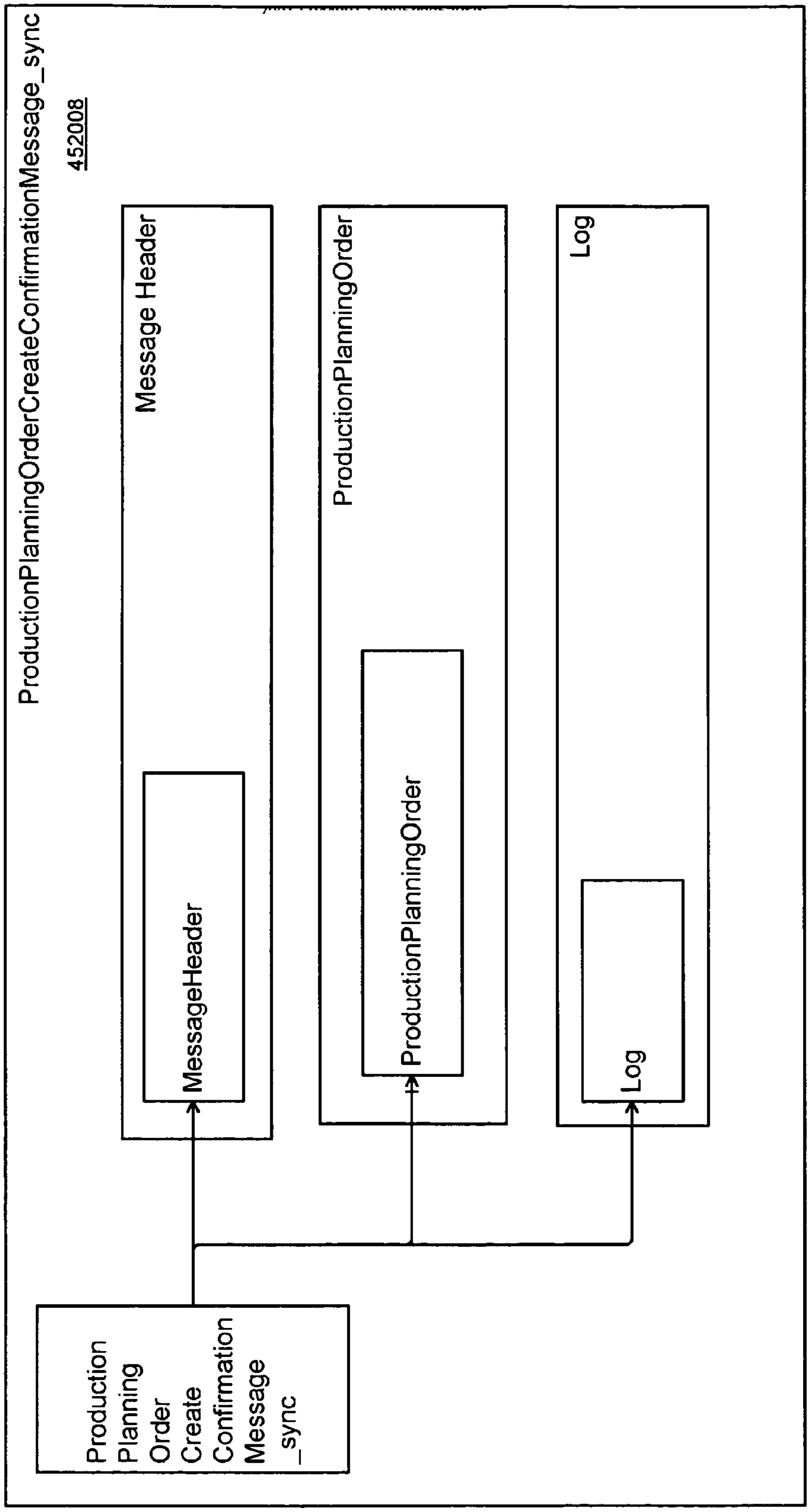
Figure 460:
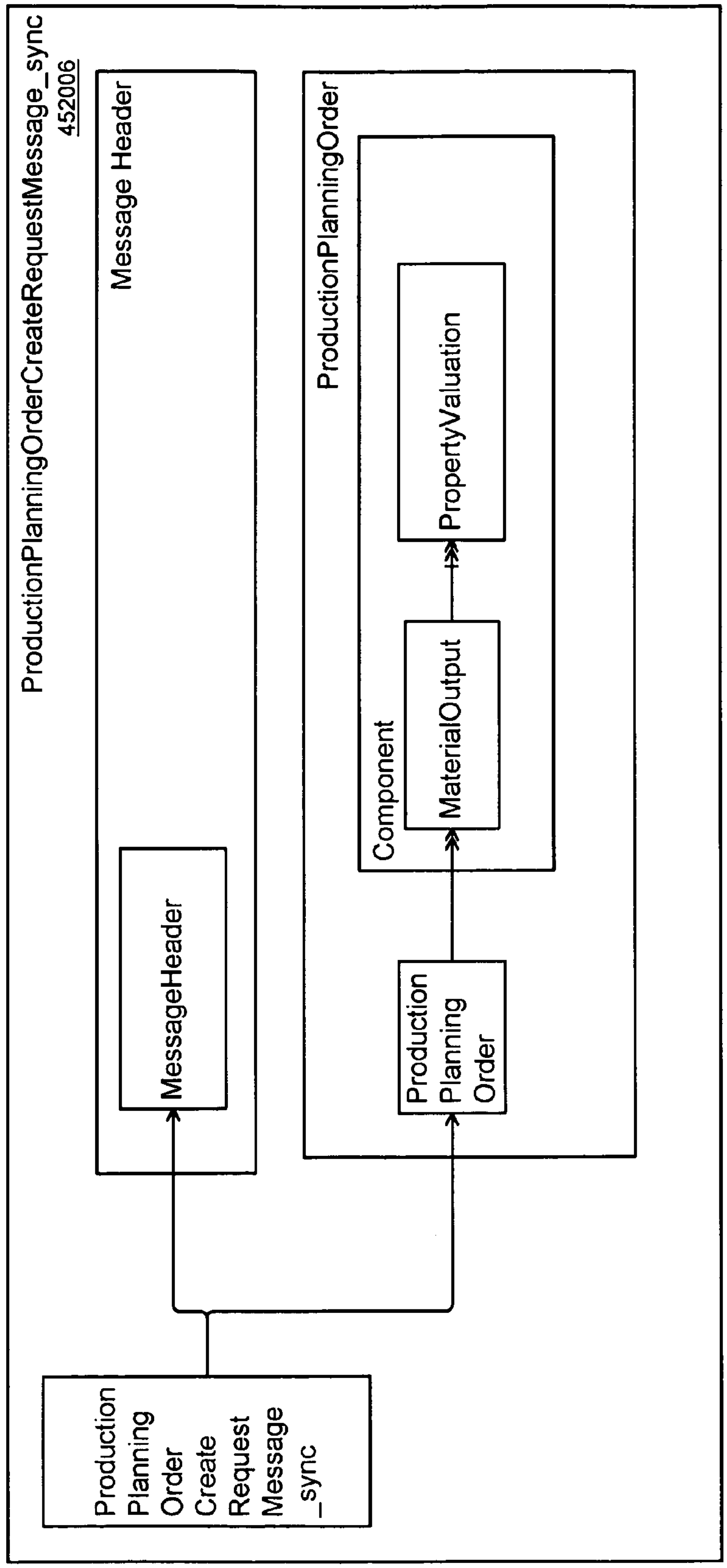
Figure 461:
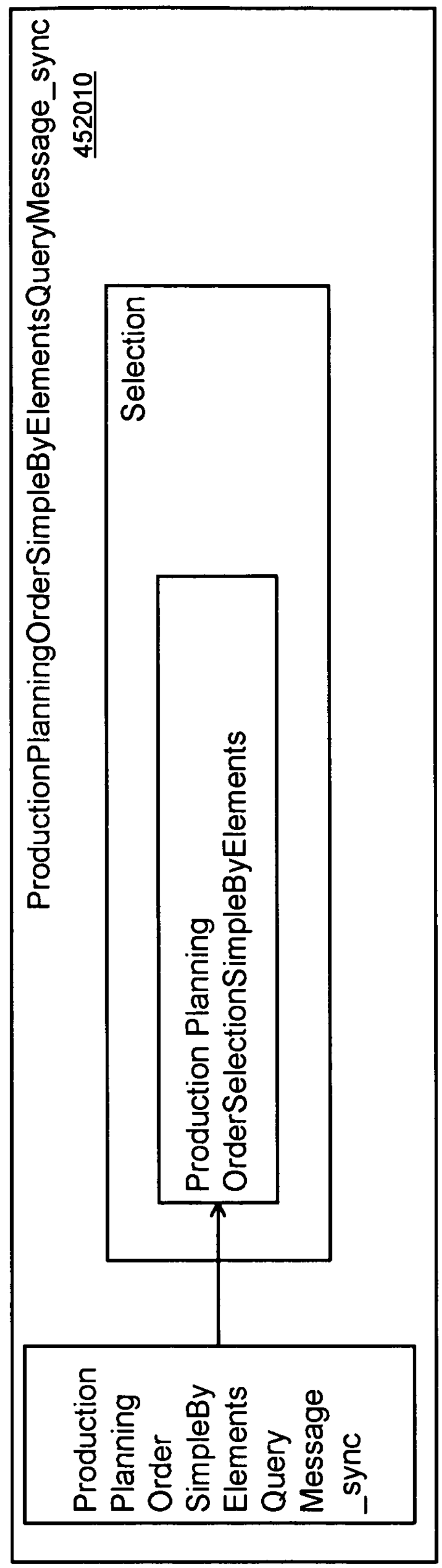
Figure 462:
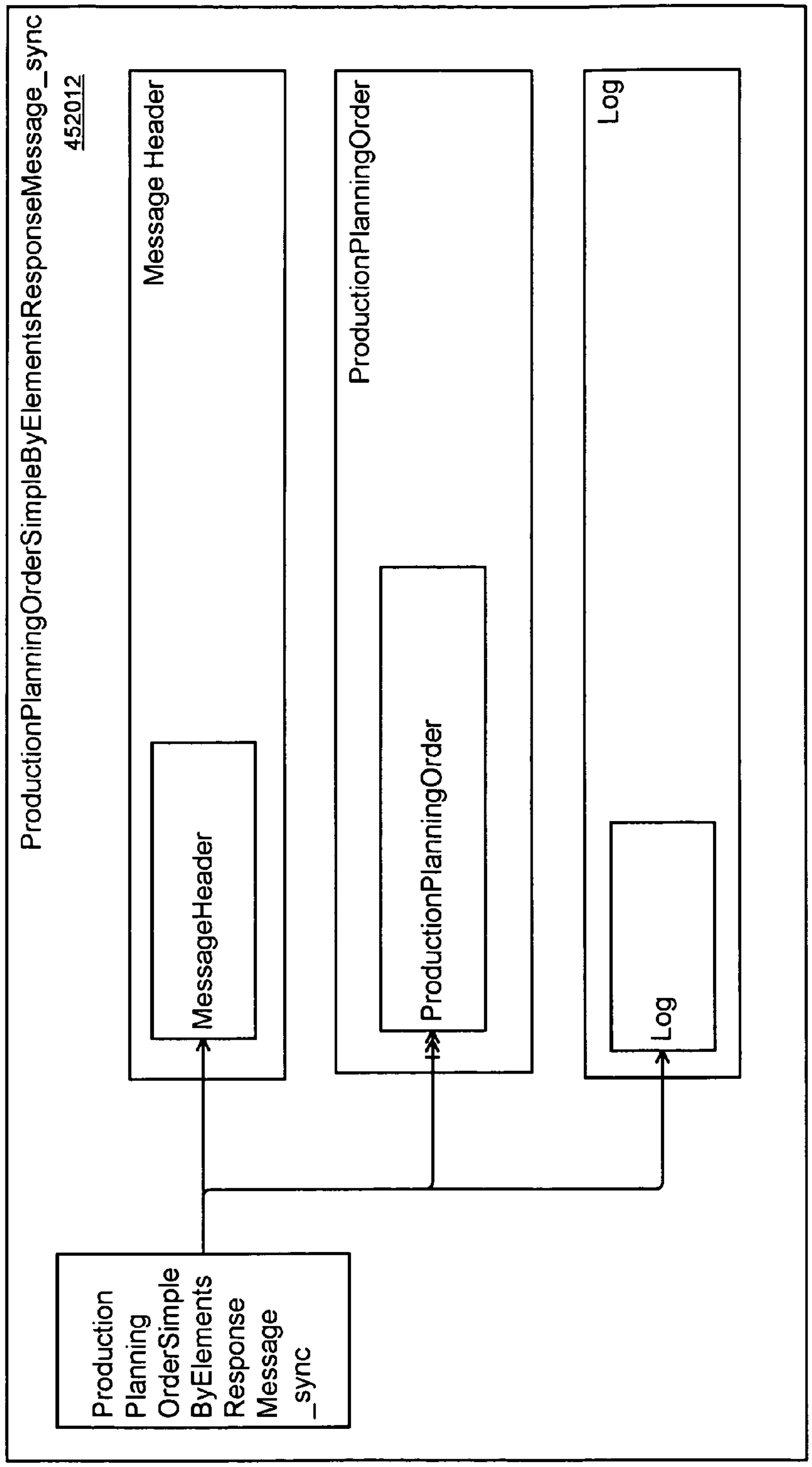
Figure 473:
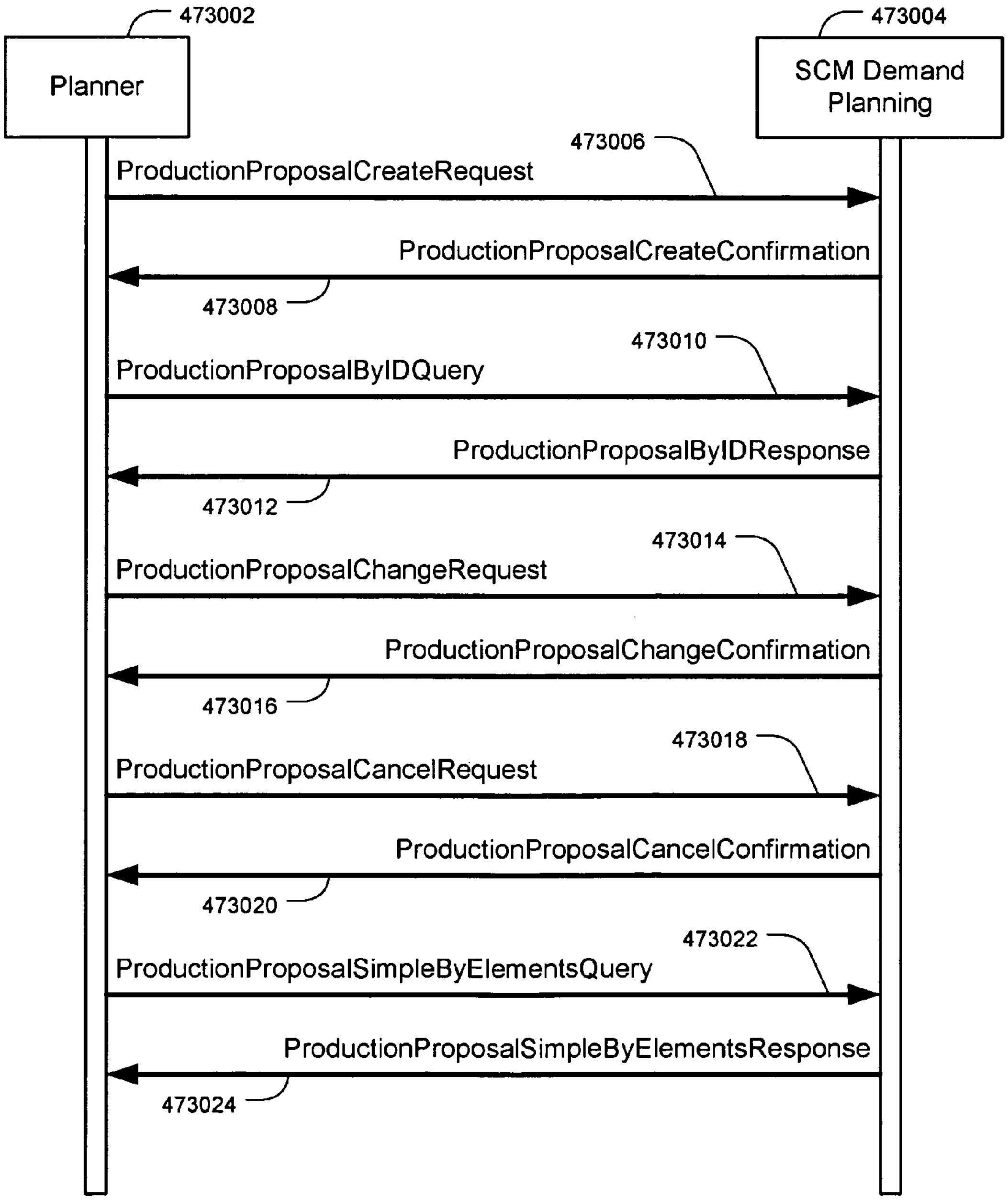
Figure 474:
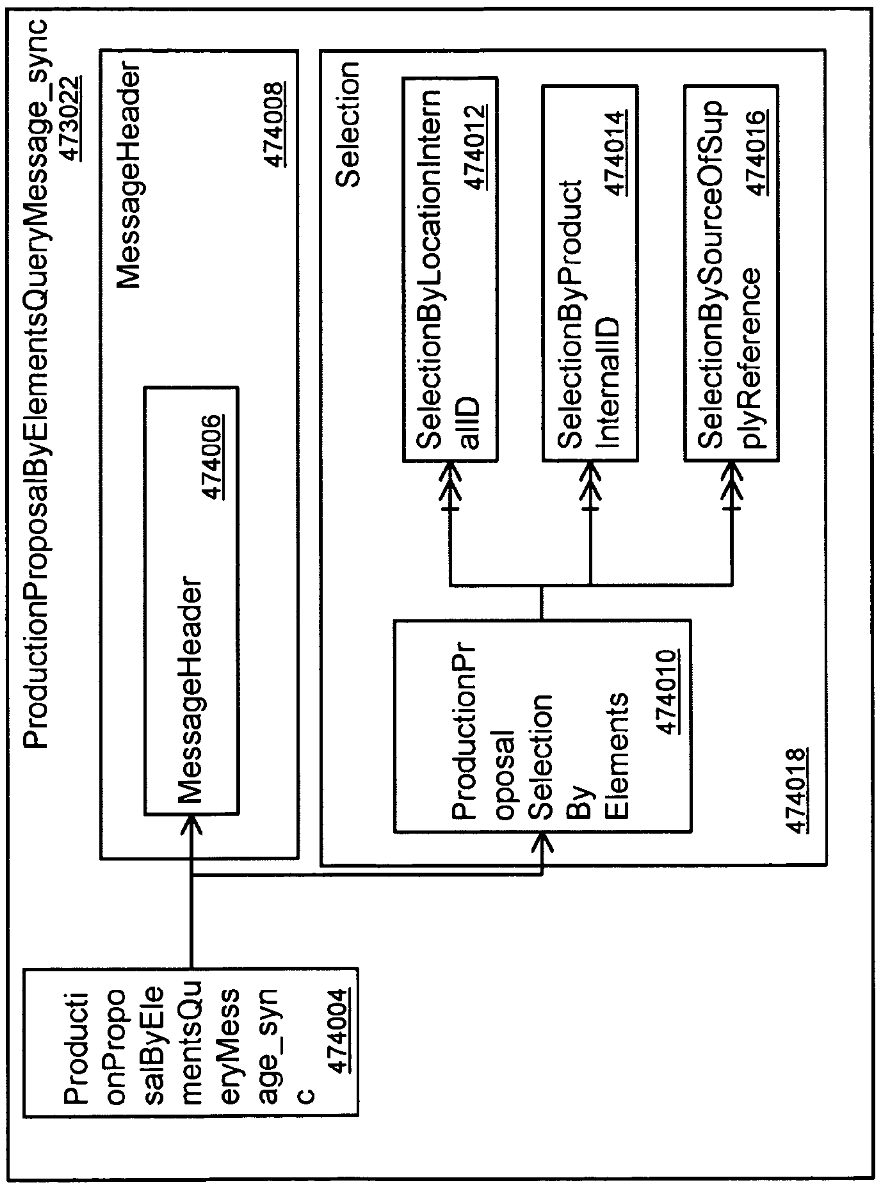
Figure 475:
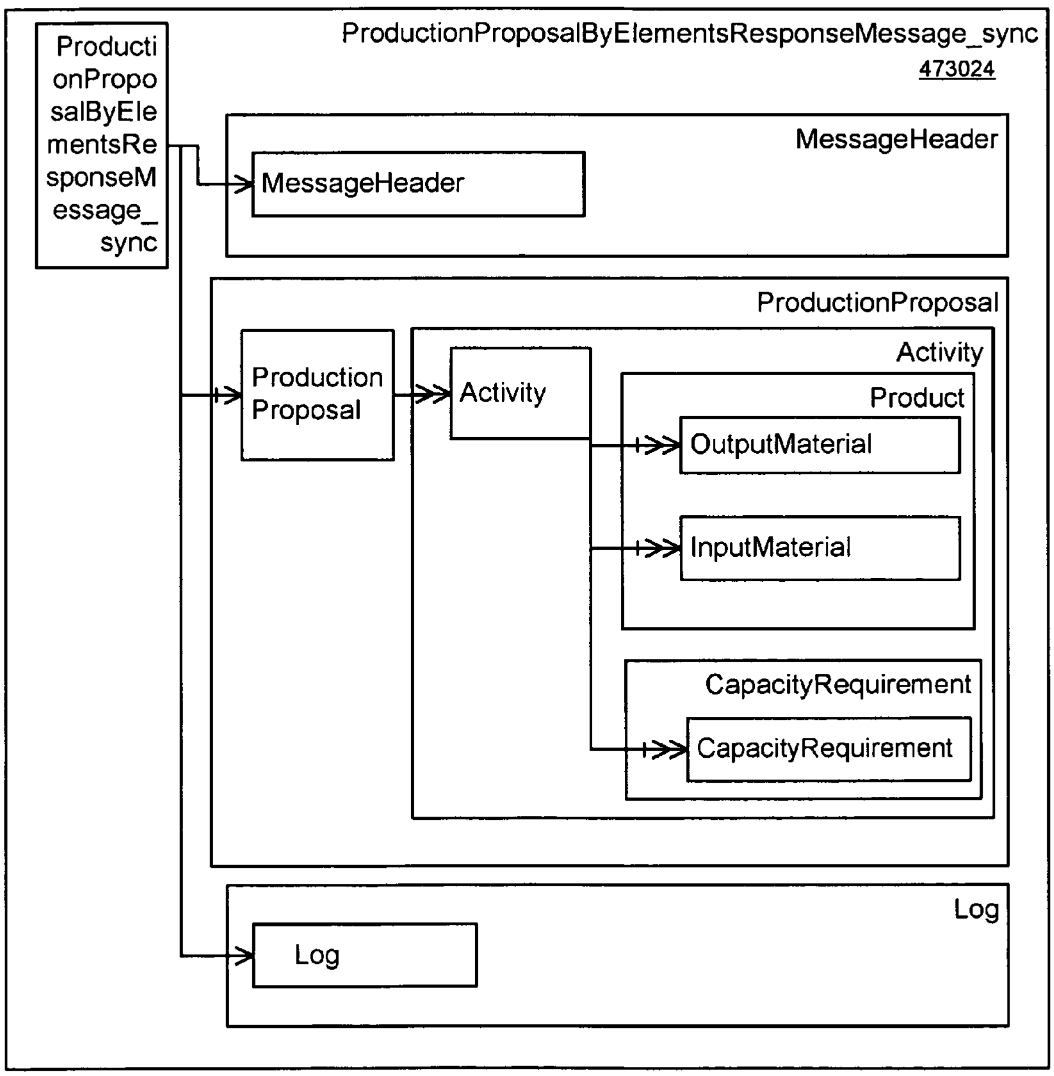
Figure 476:
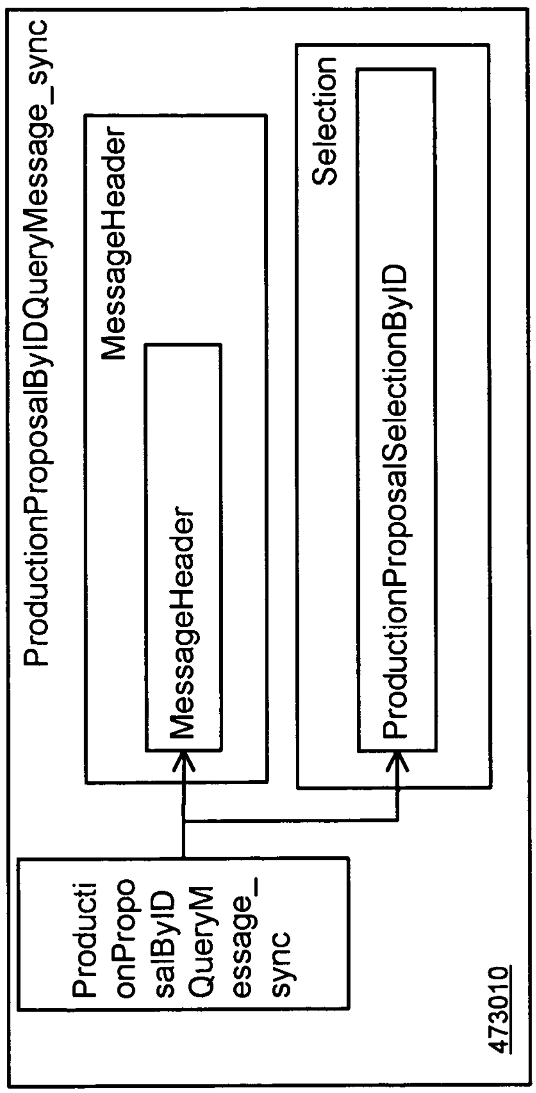
Figure 477:
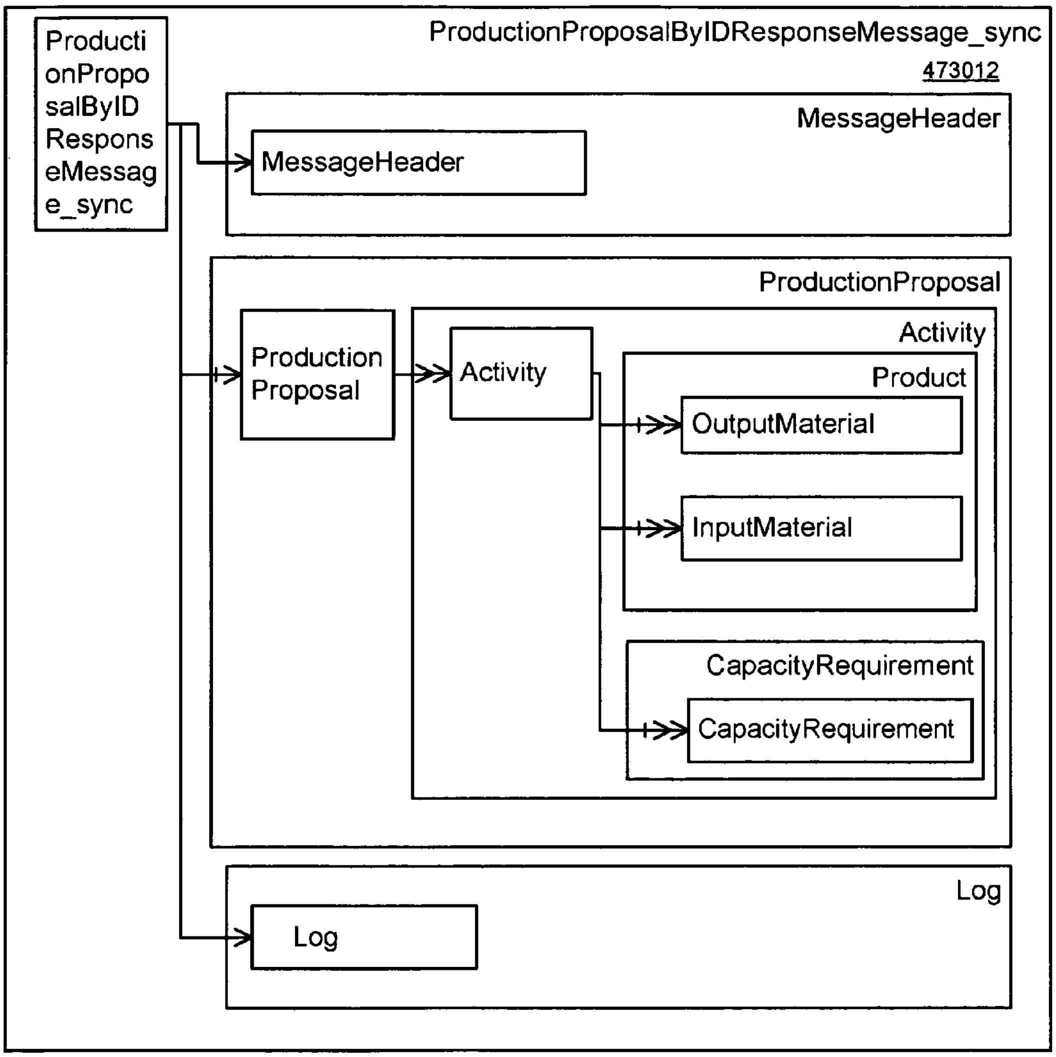
Figure 478:
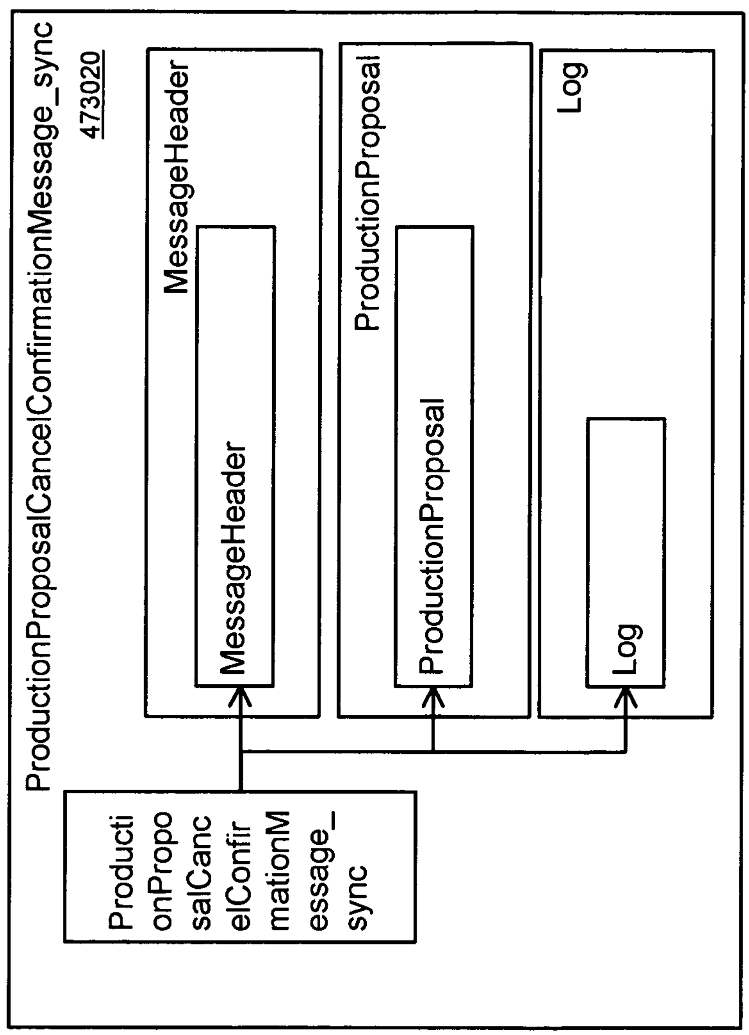
Figure 479:
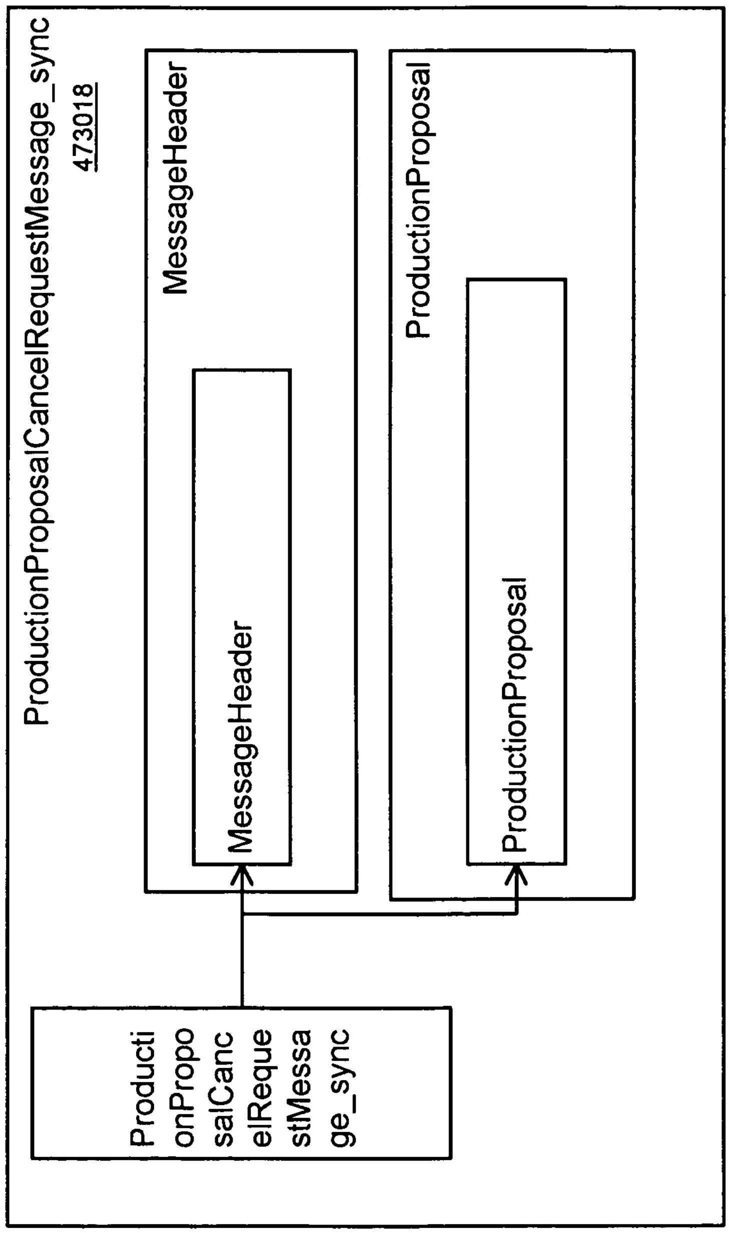
Figure 480:
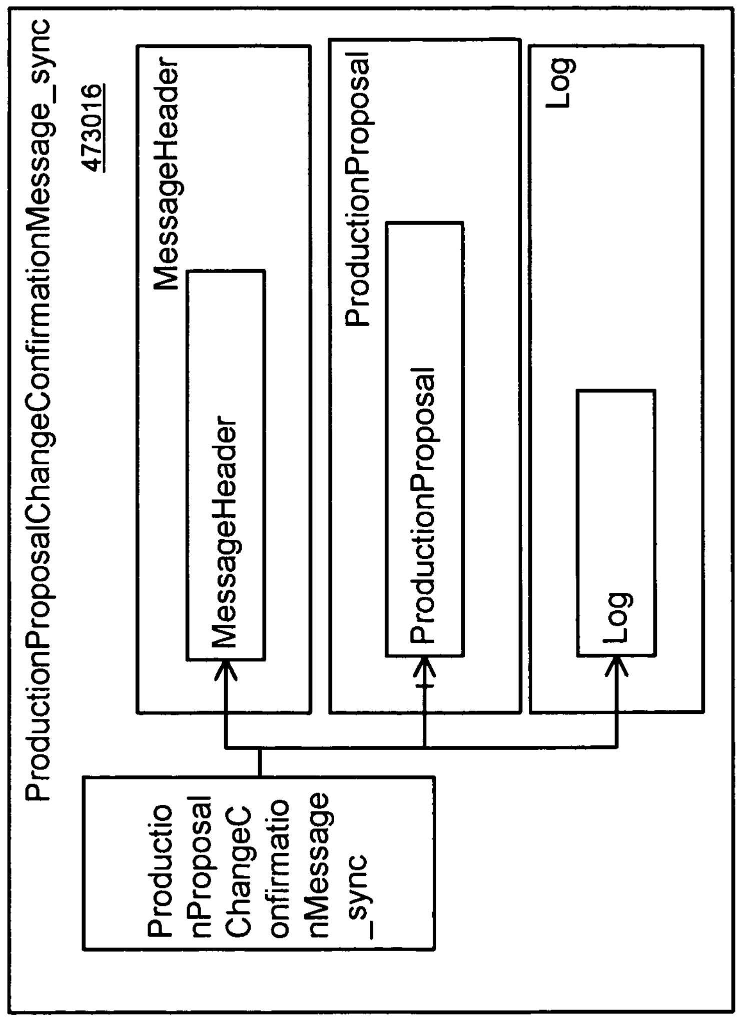
Figure 481:
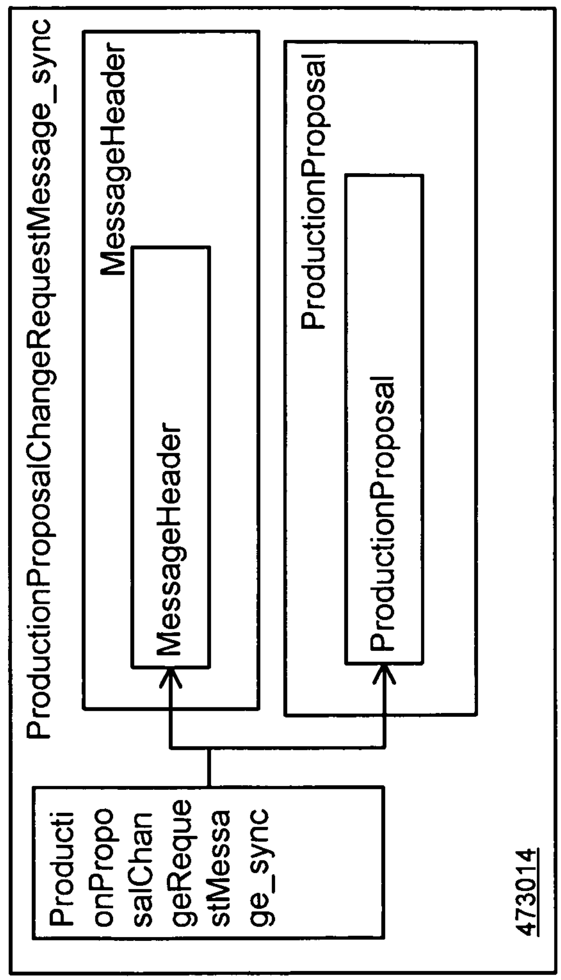
Figure 482:
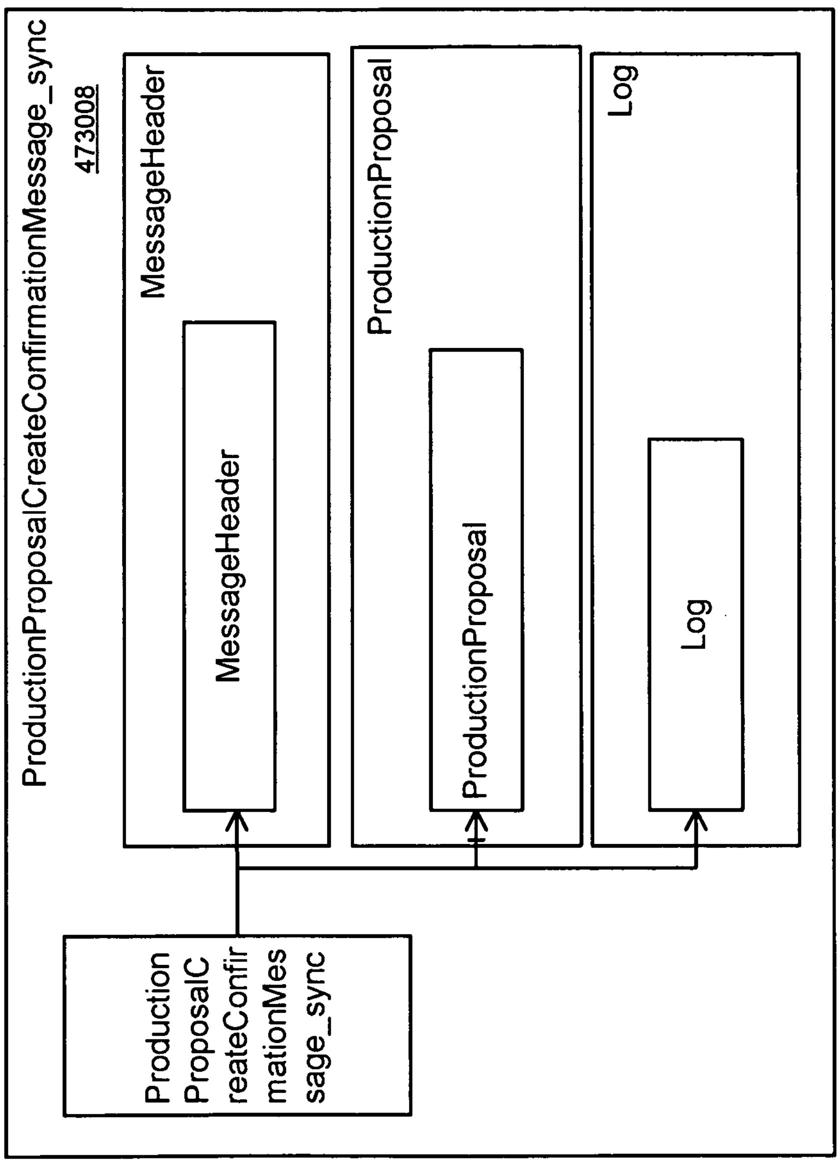
Figure 483:
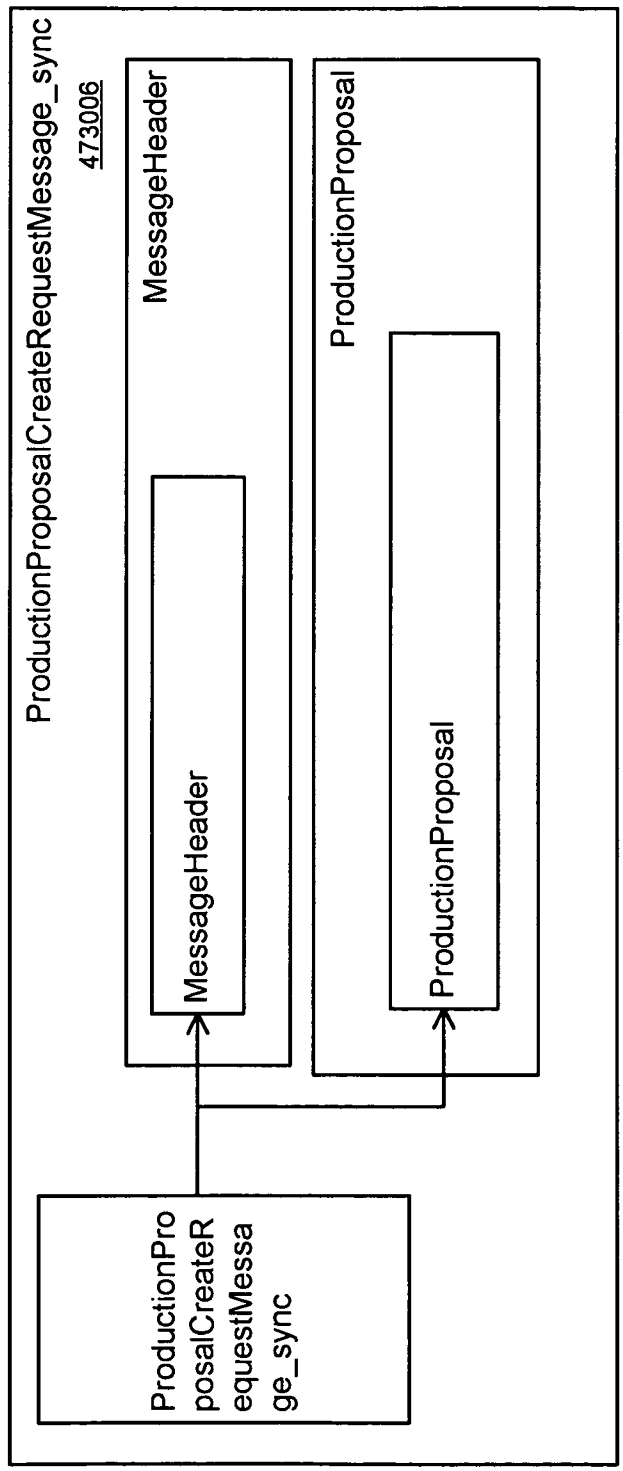
Figure 494:
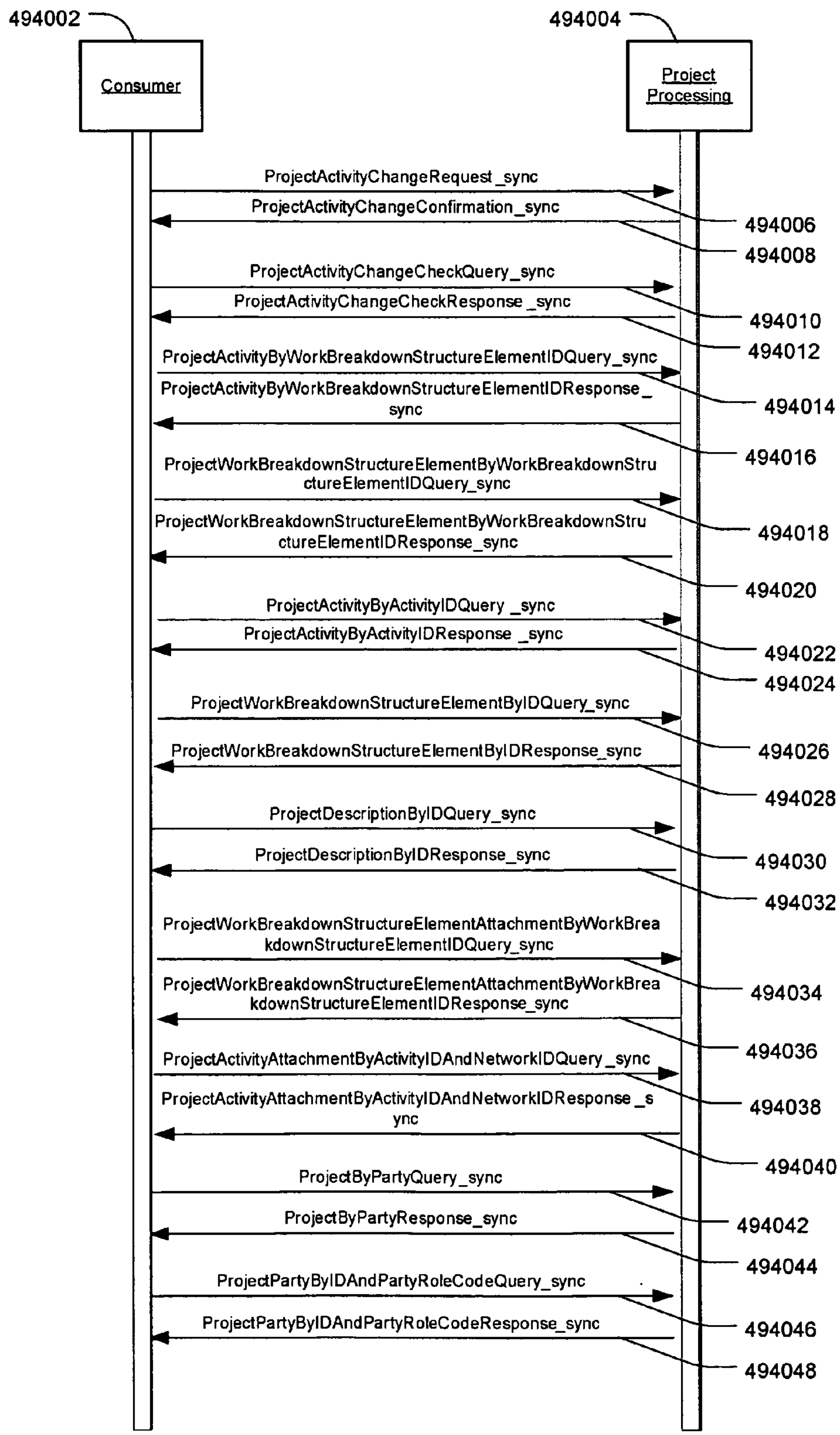
Figure 495:
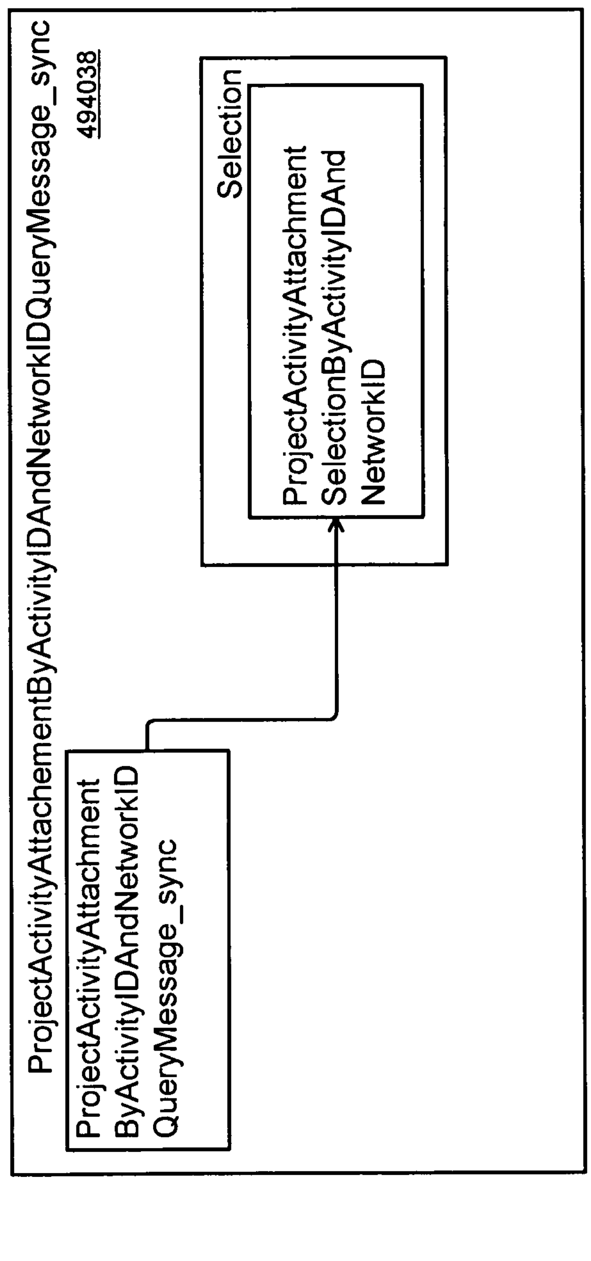
Figure 496:
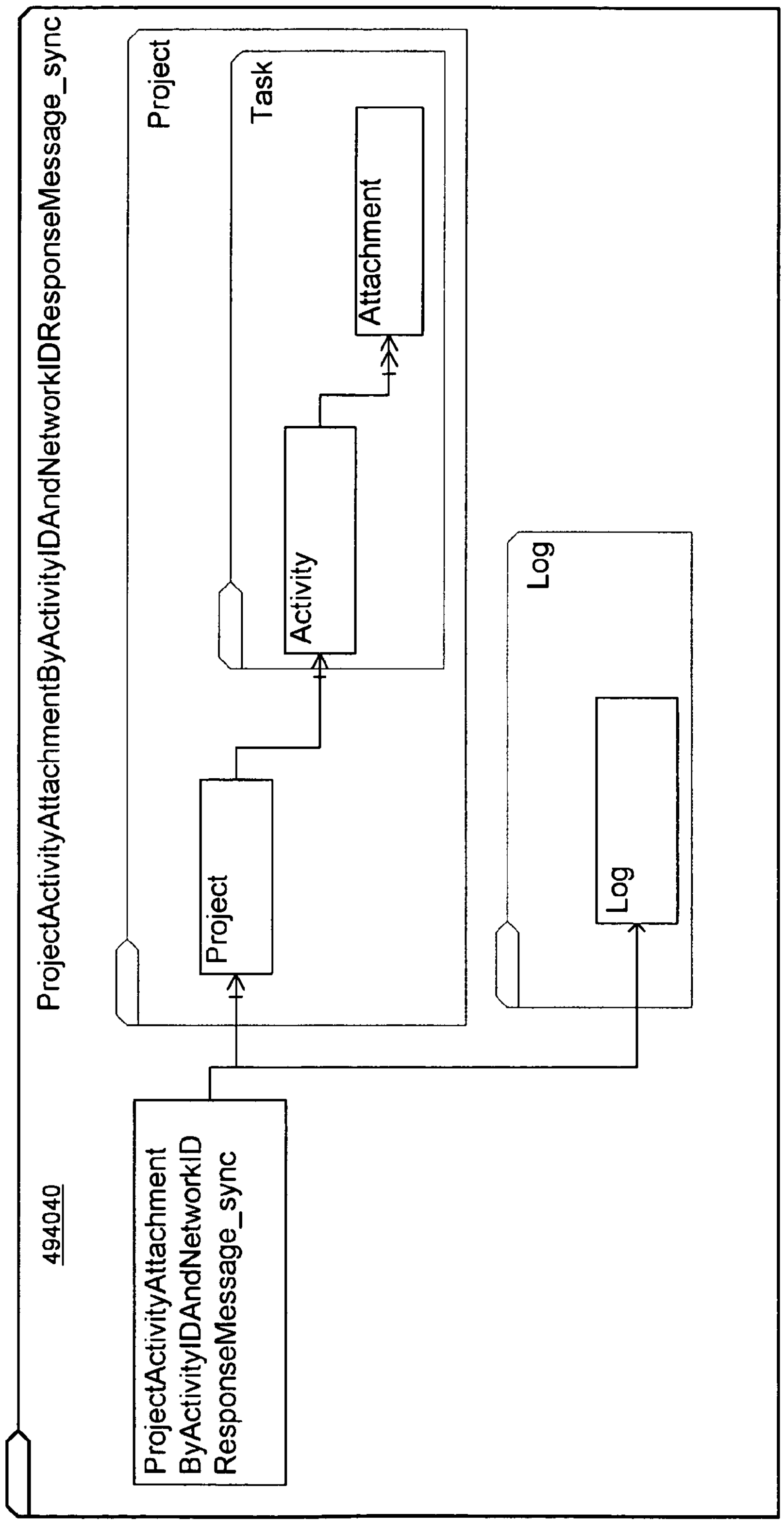
Figure 497:
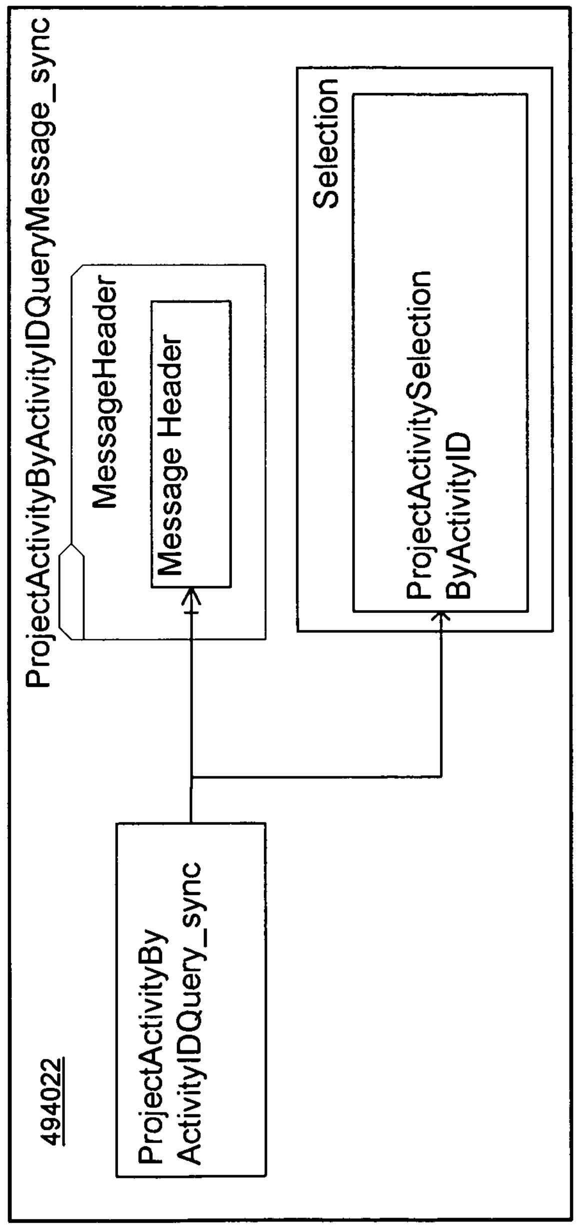
Figure 498:
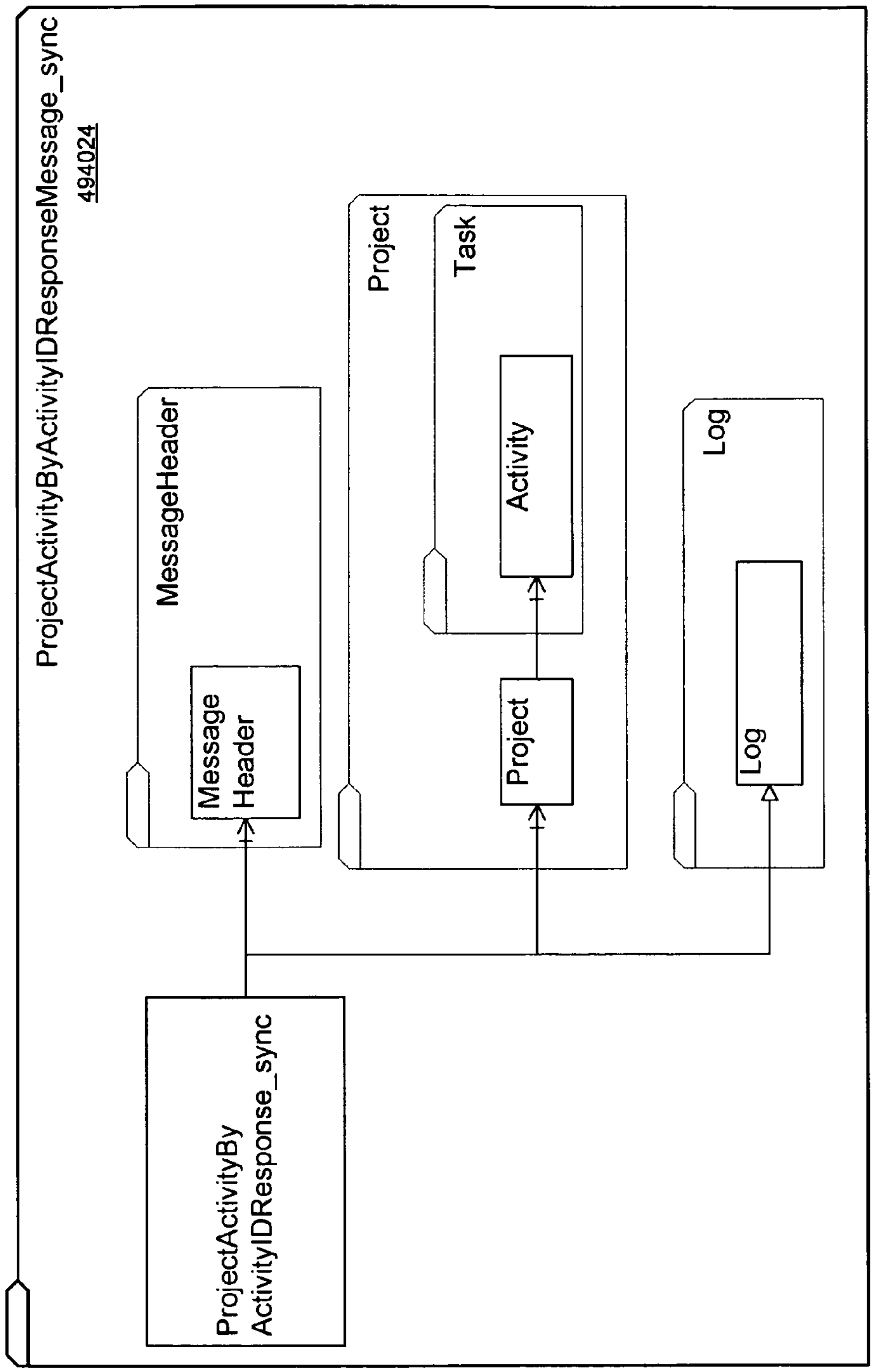
Figure 499:
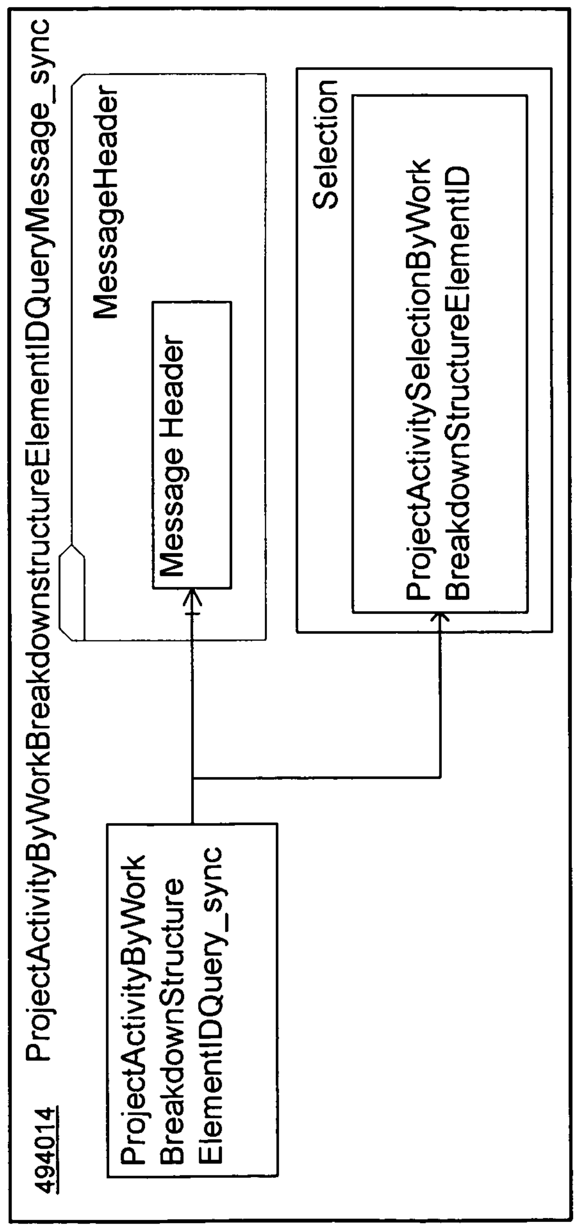
Figure 500:
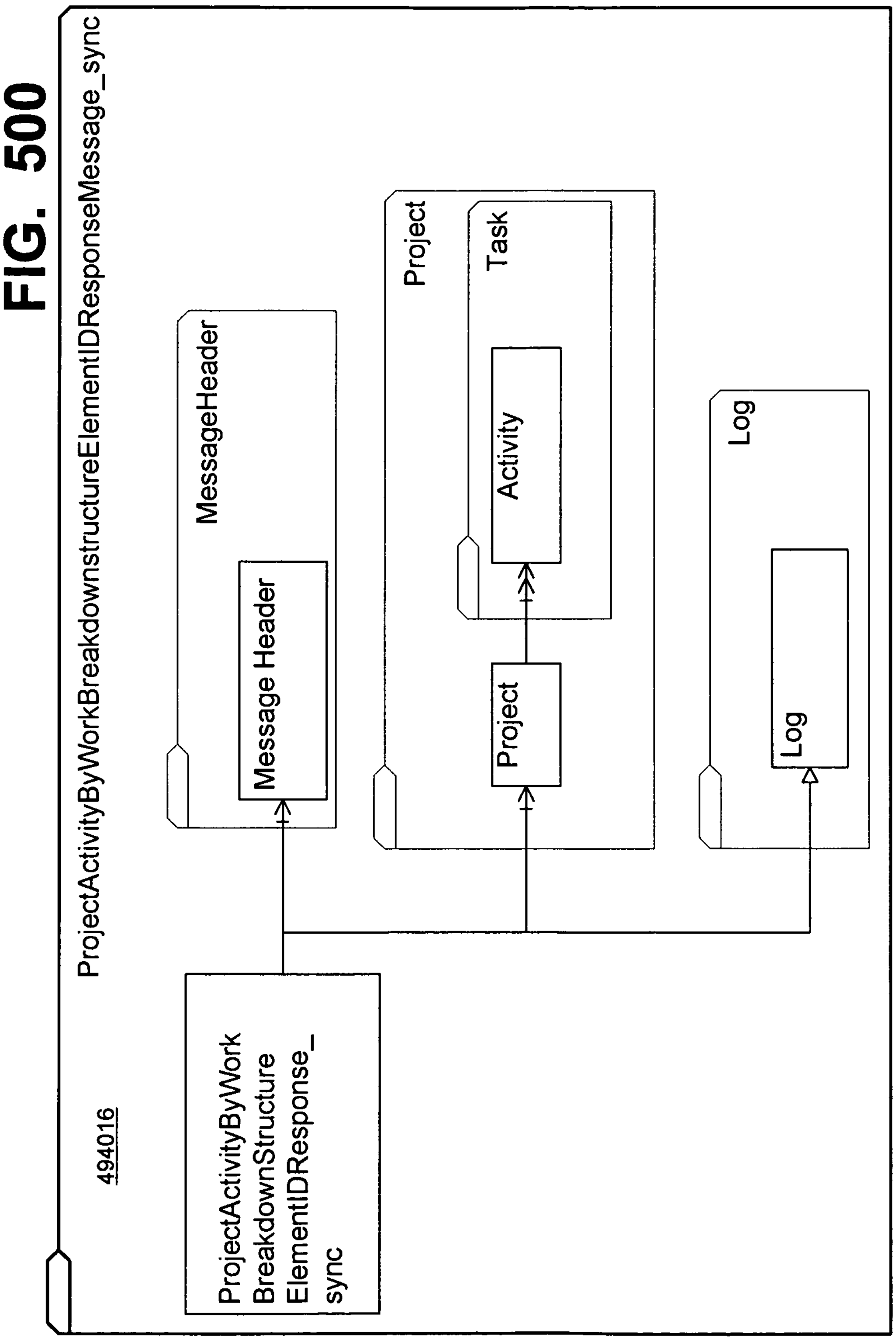
Figure 501:
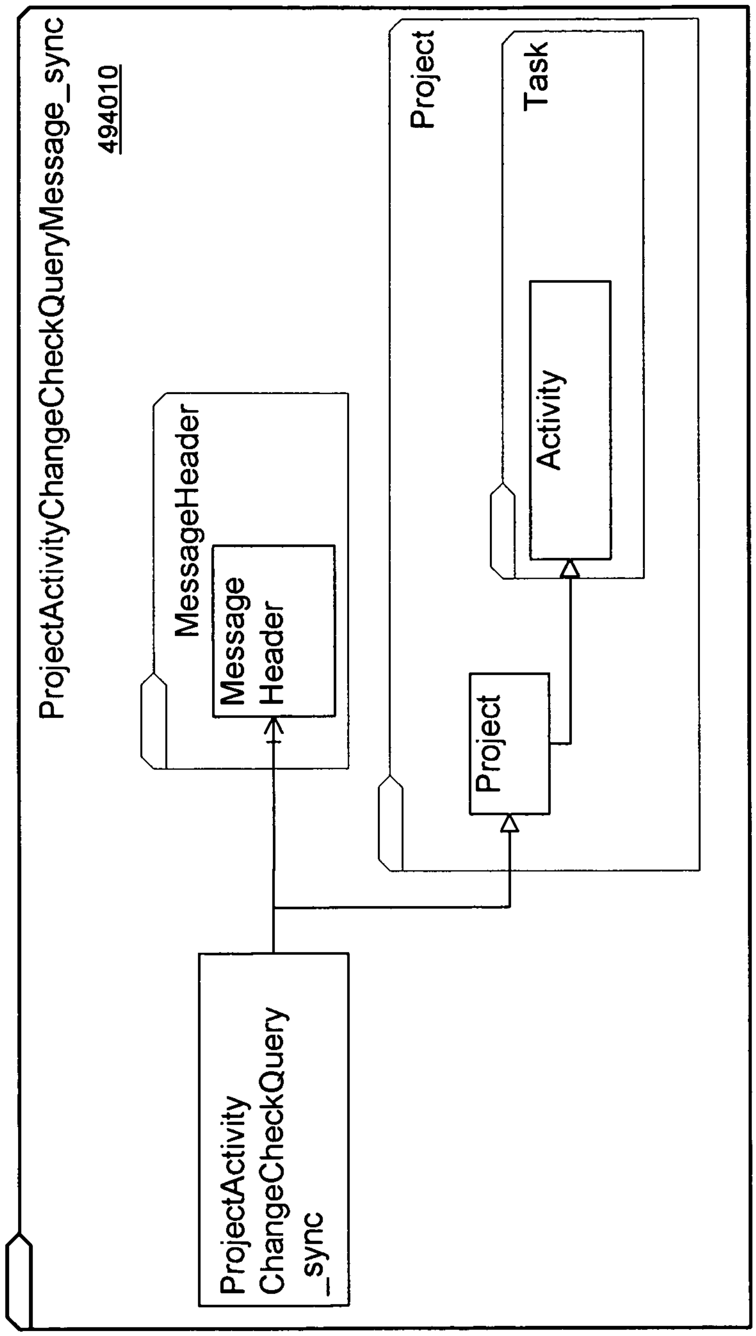
Figure 502:
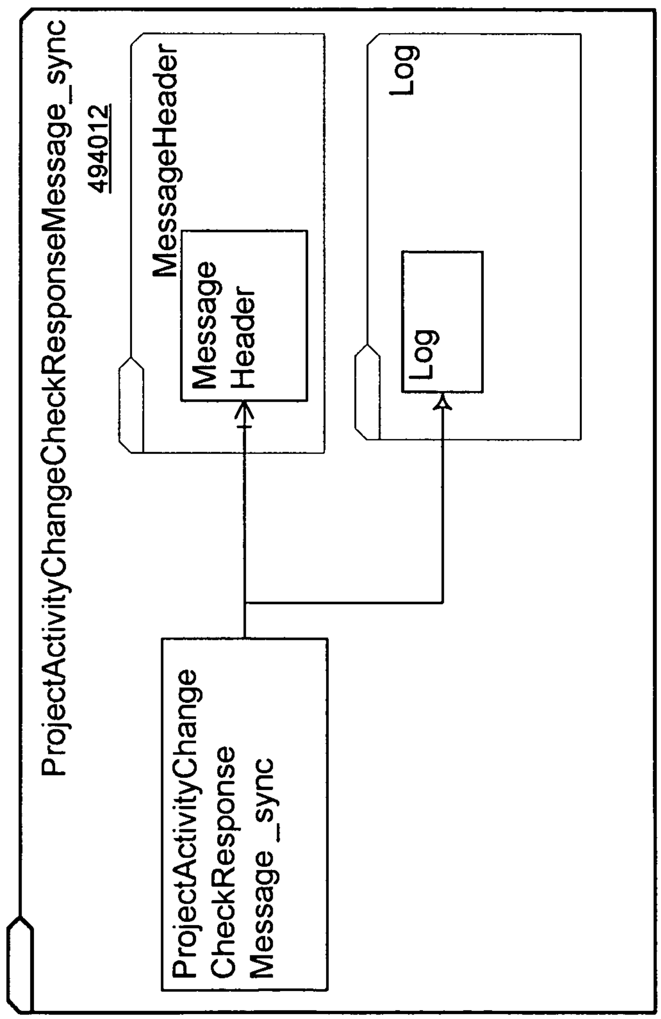
Figure 503:
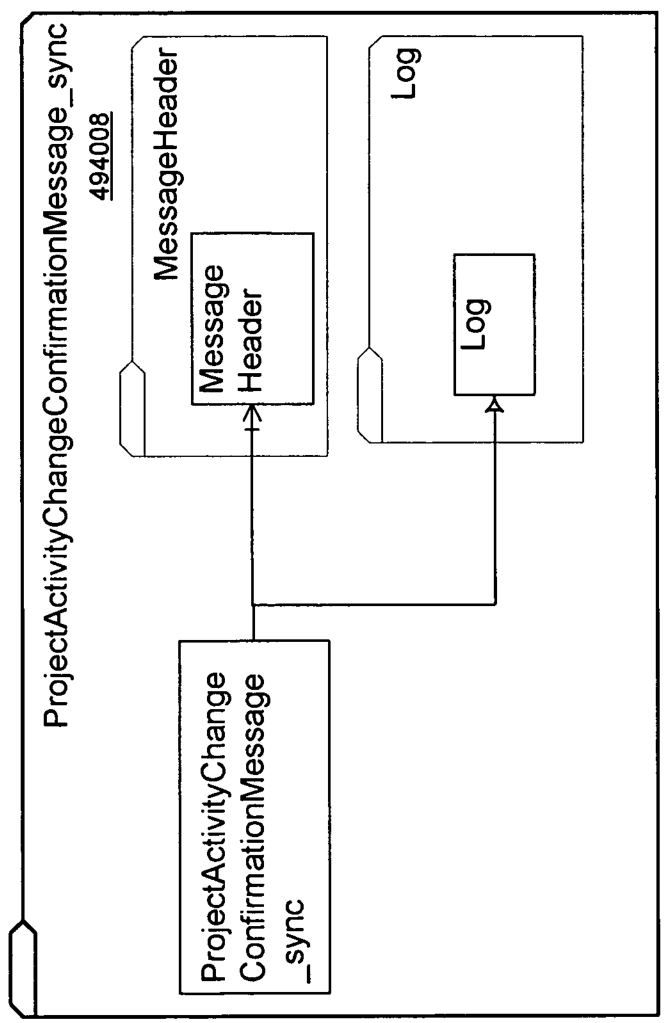
Figure 504:
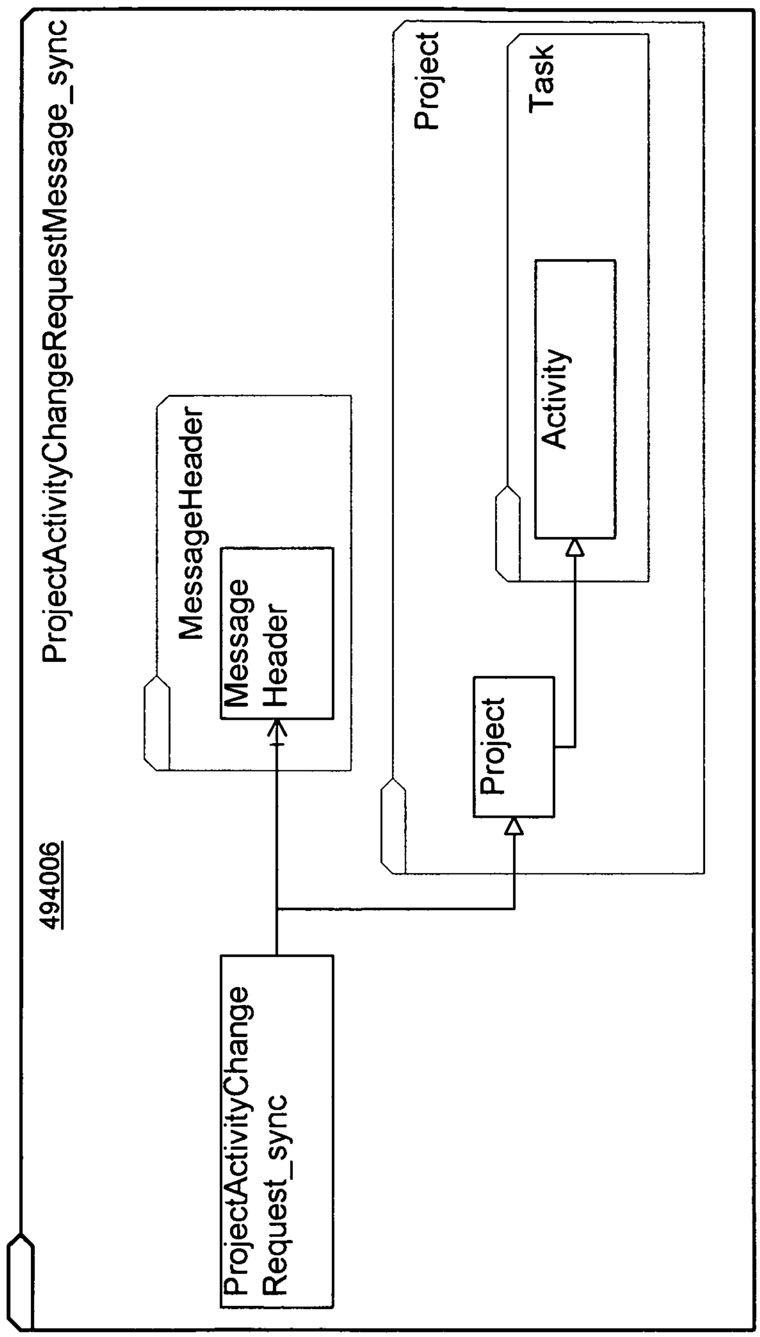
Figure 505:
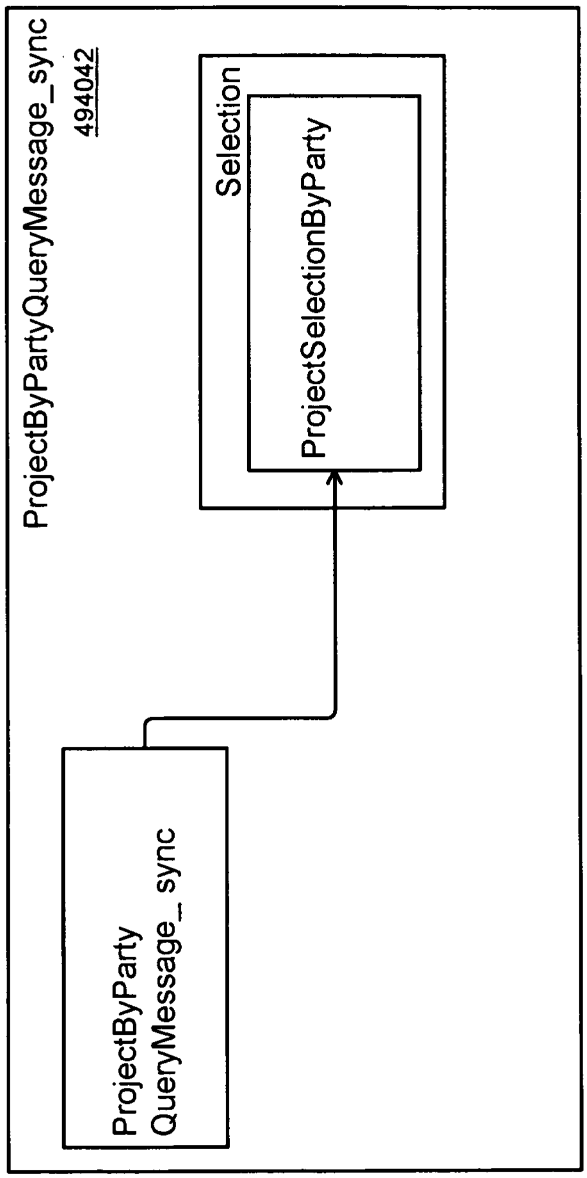
Figure 506:
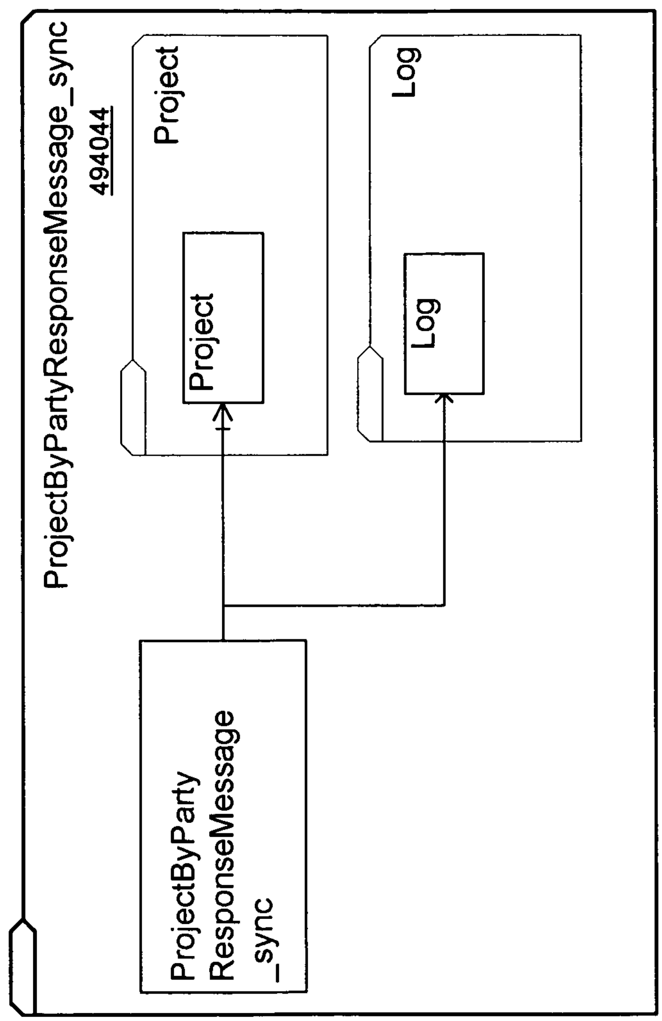
Figure 507:
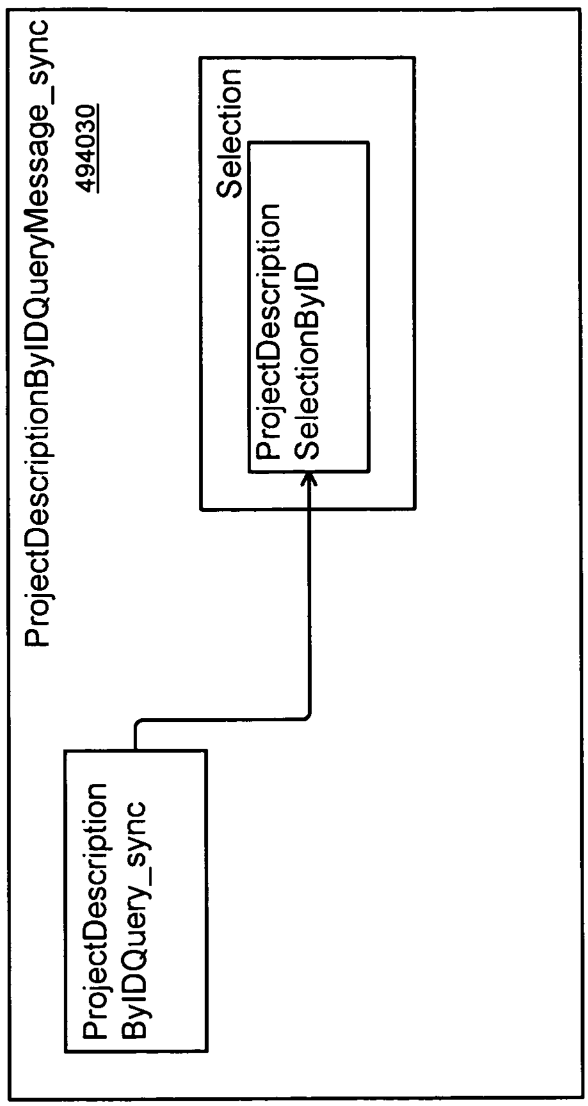
Figure 508:
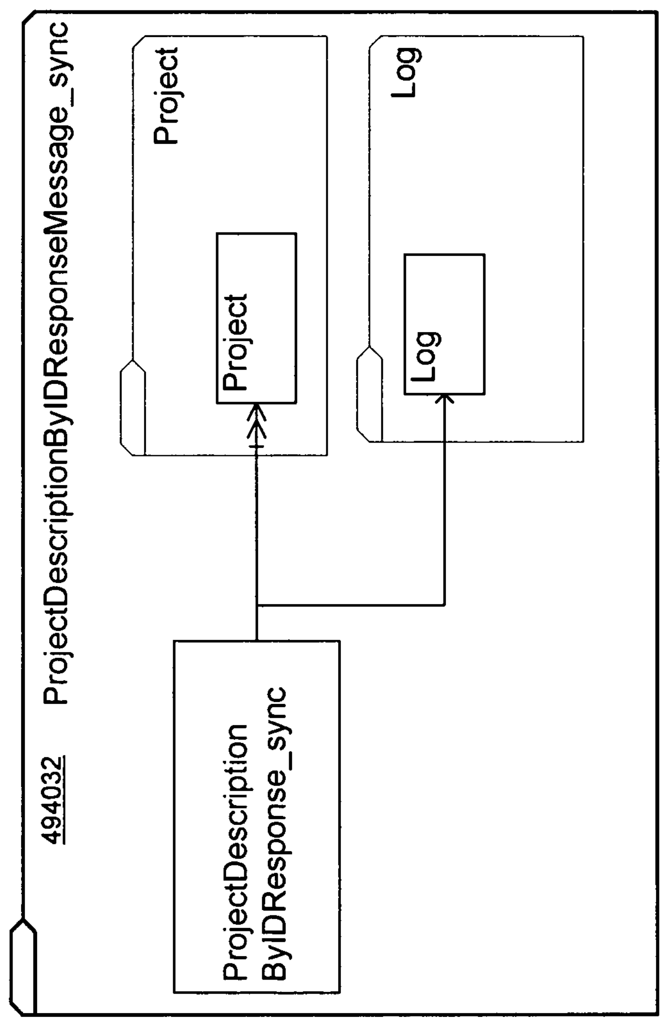
Figure 509:
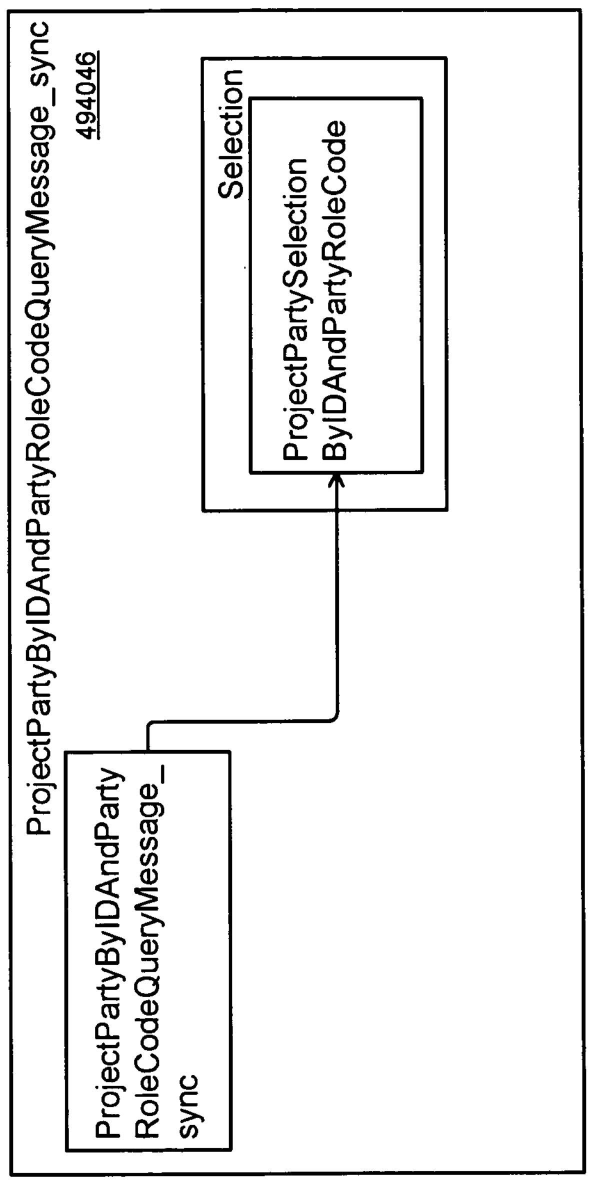
Figure 510:
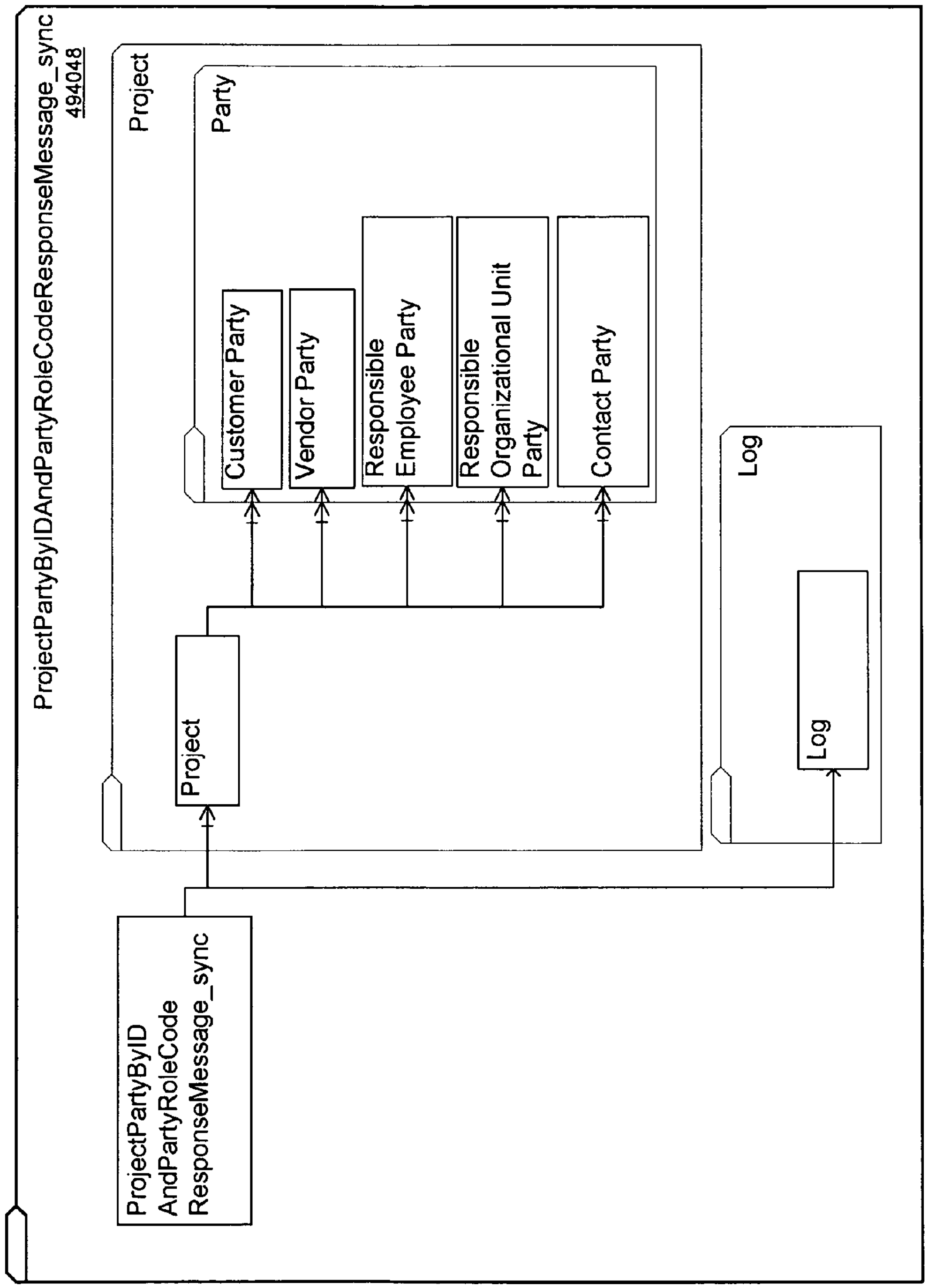
Figure 511:
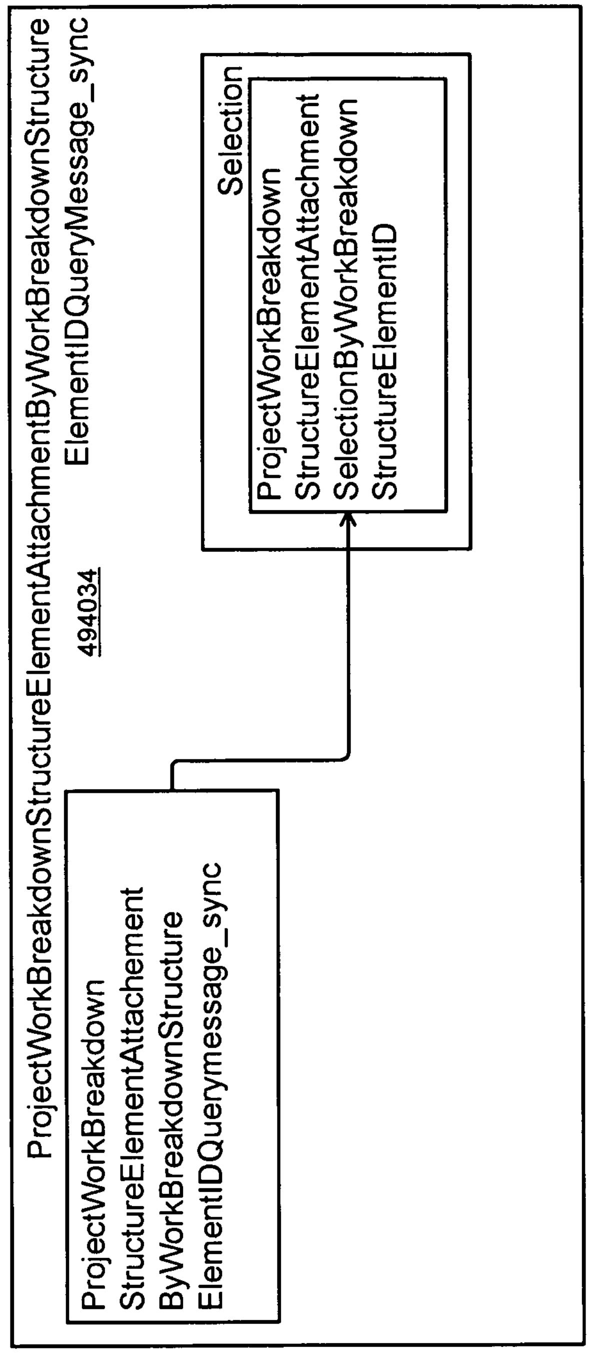
Figure 512:
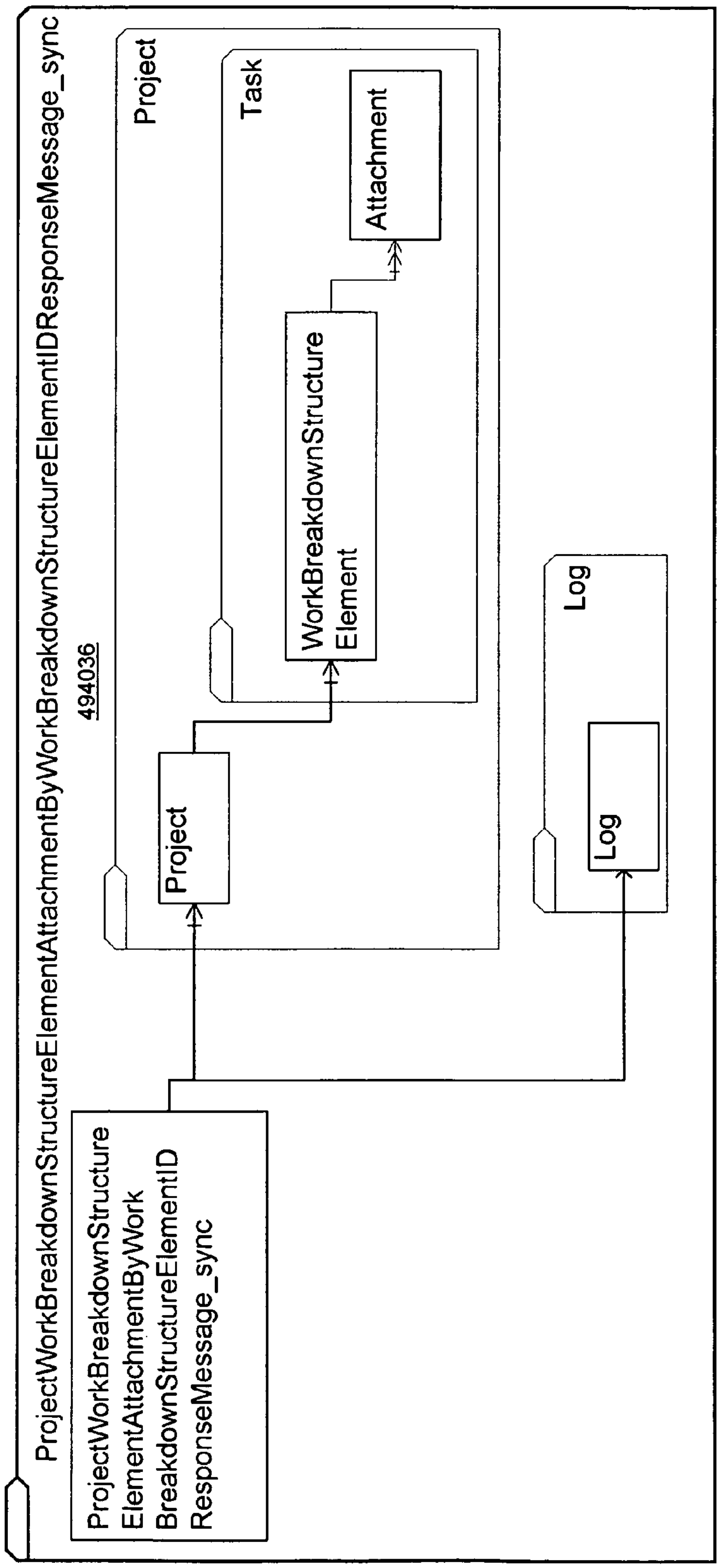
Figure 513:
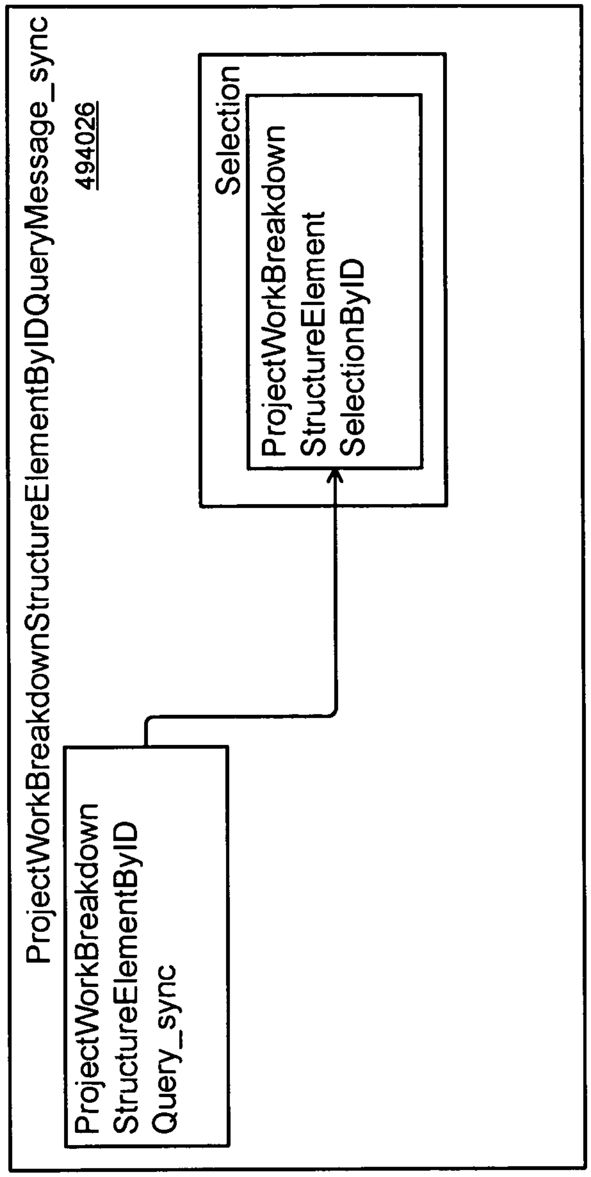
Figure 514:
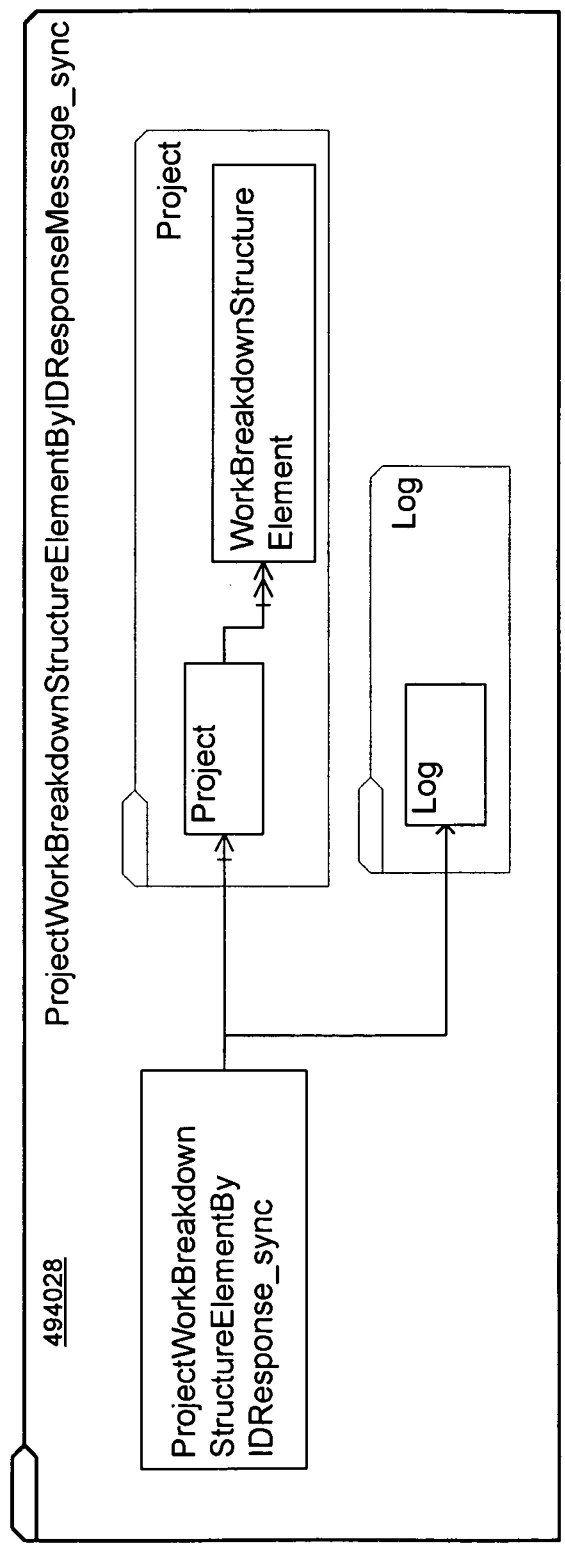
Figure 515:
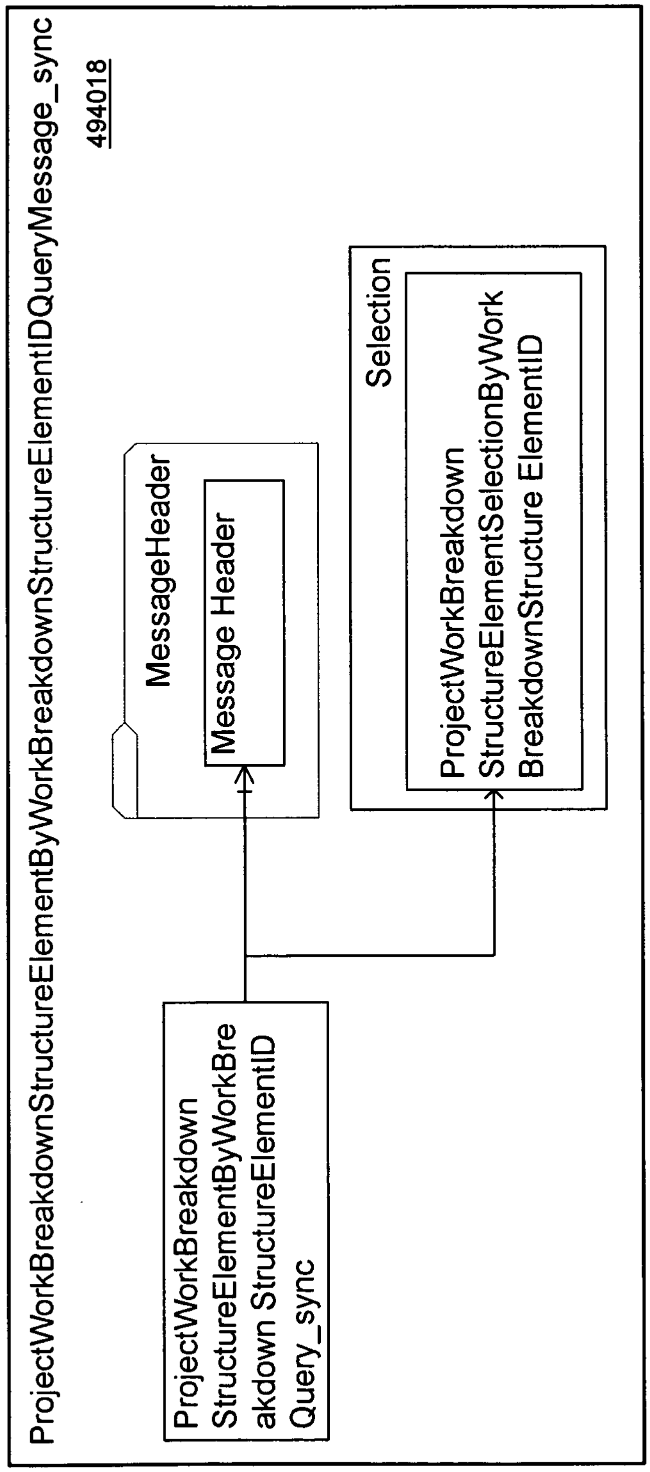
Figure 516:
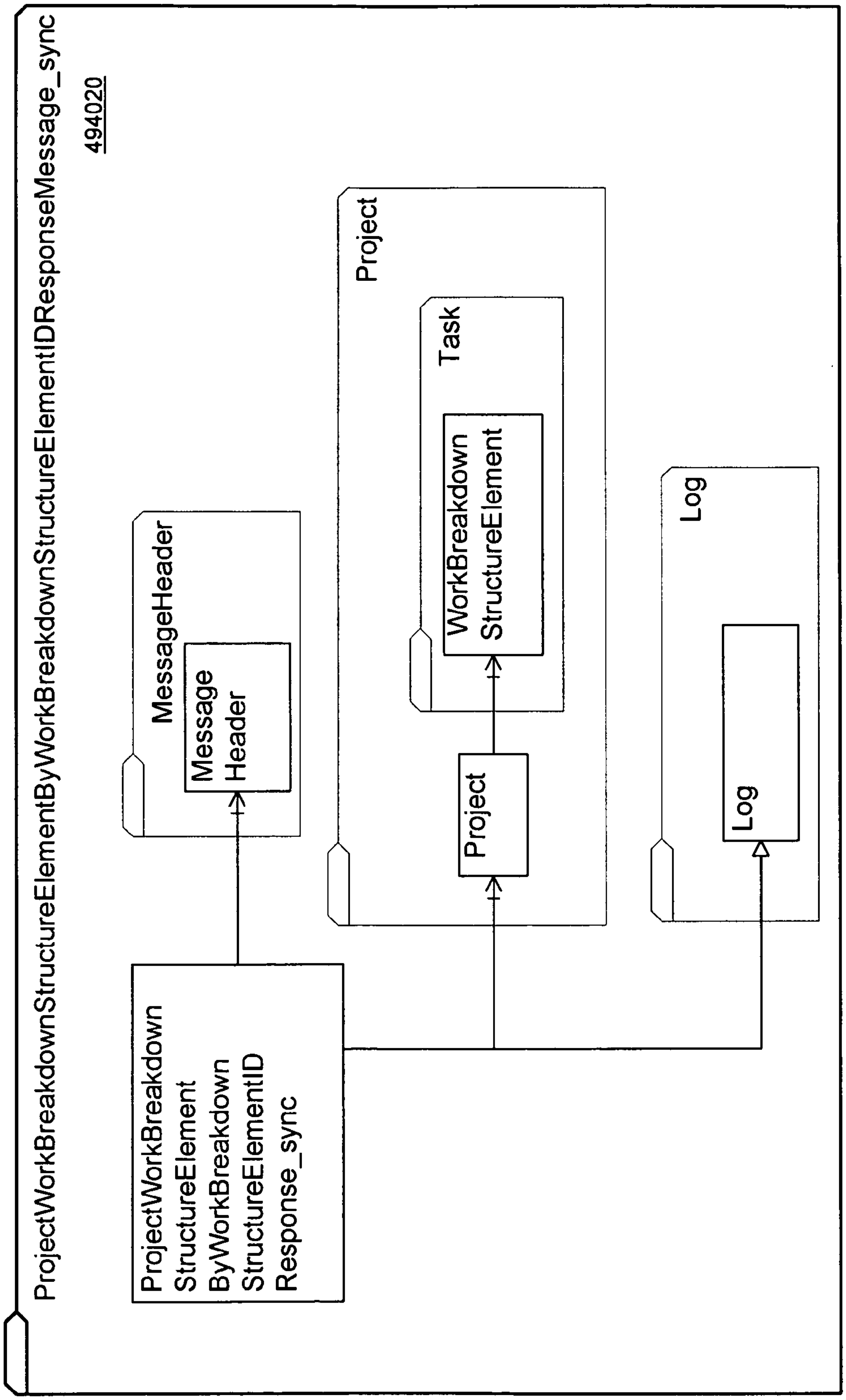
Figure 540:
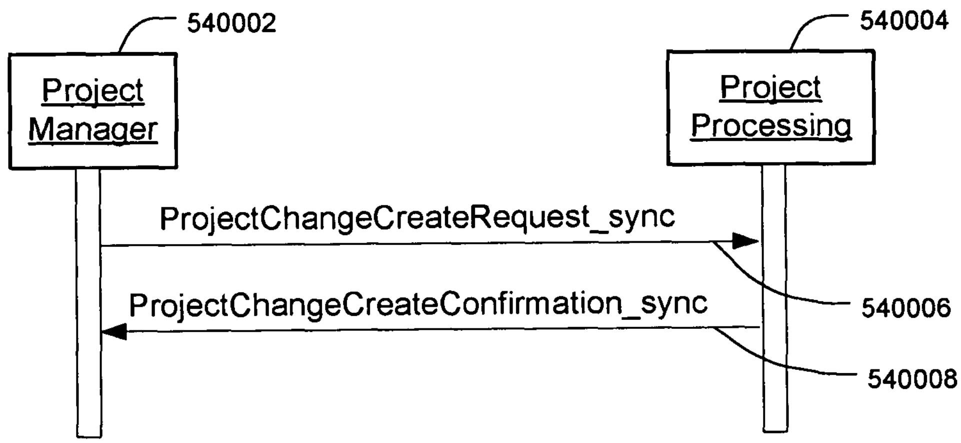
Figure 541:
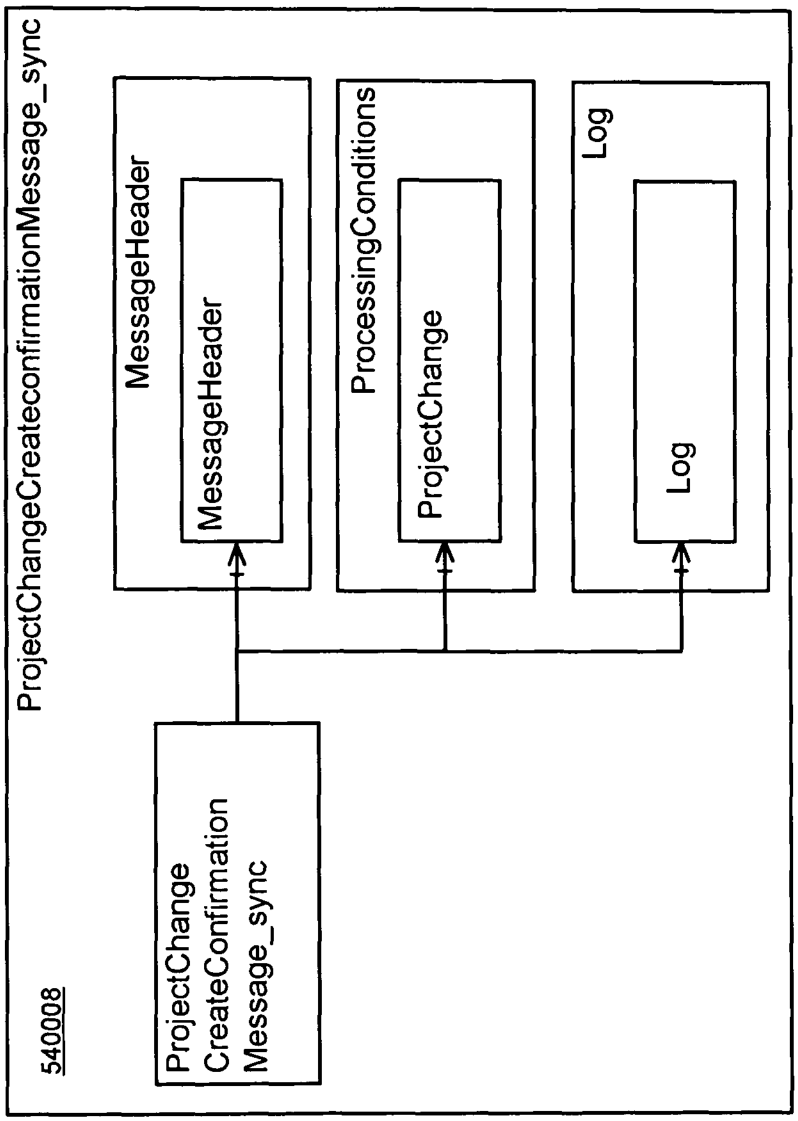
Figure 542:
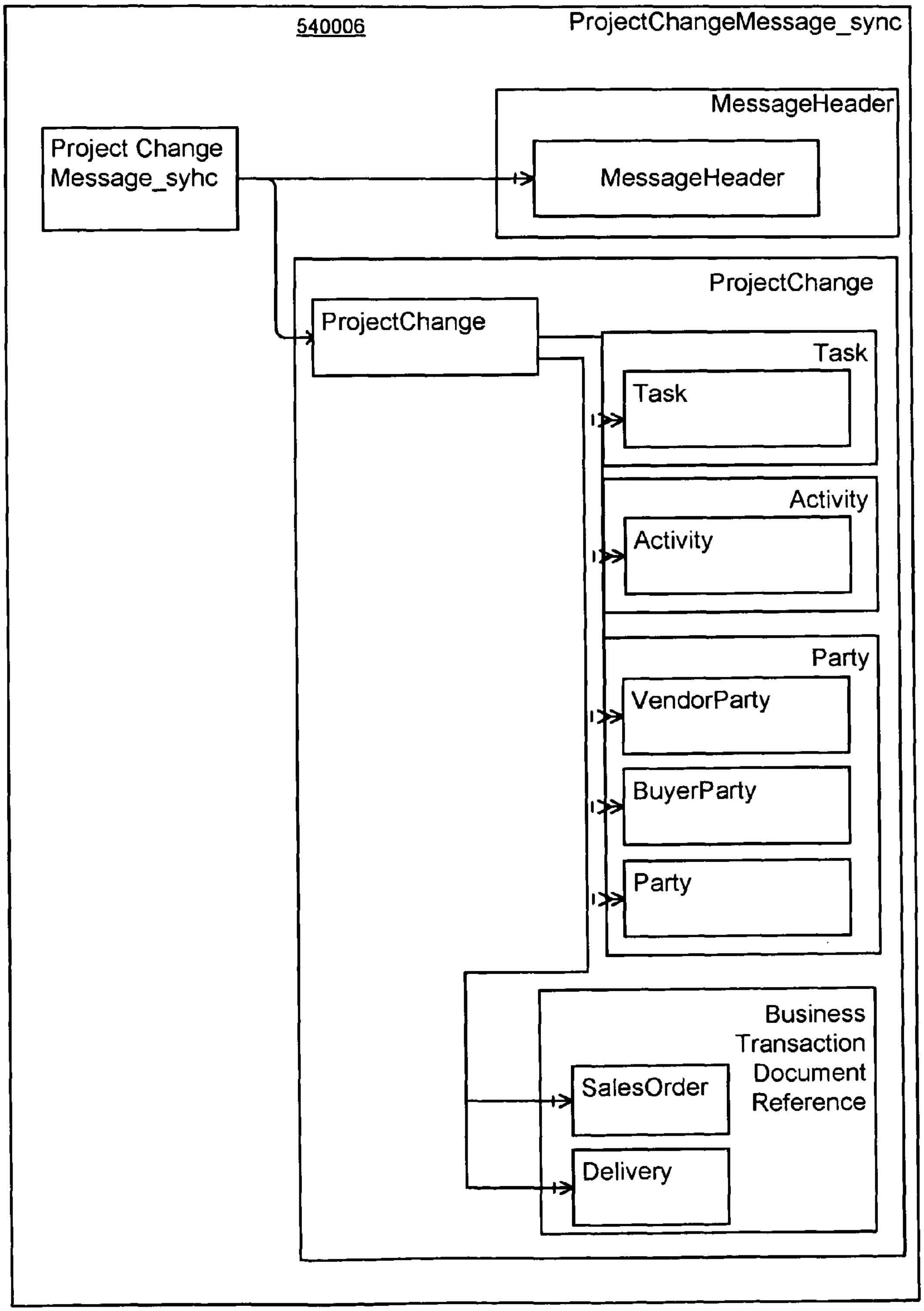
Figure 545:
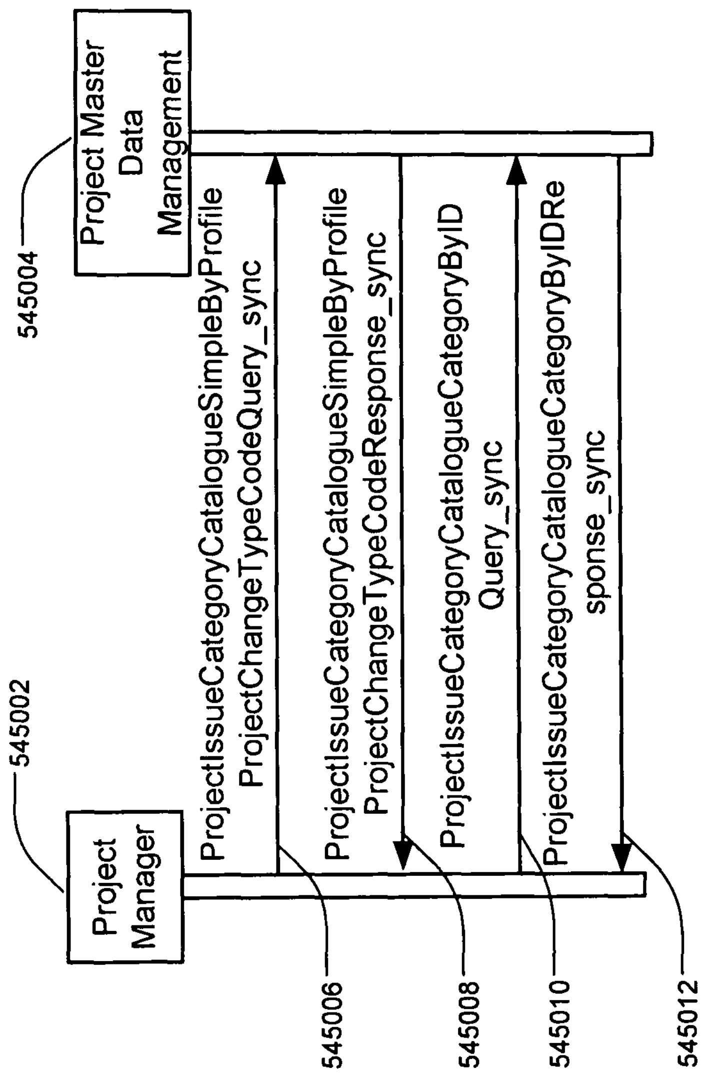
Figure 546:
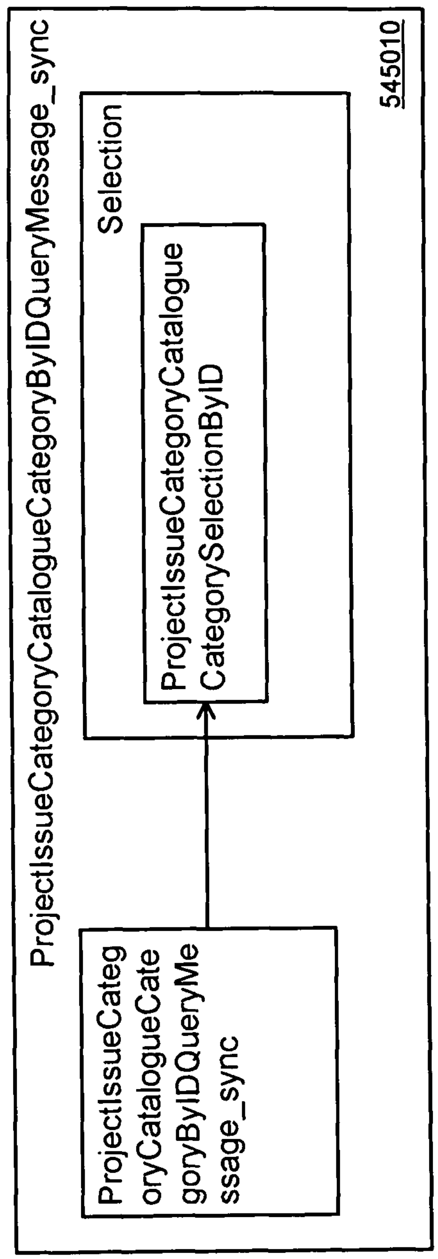
Figure 547:
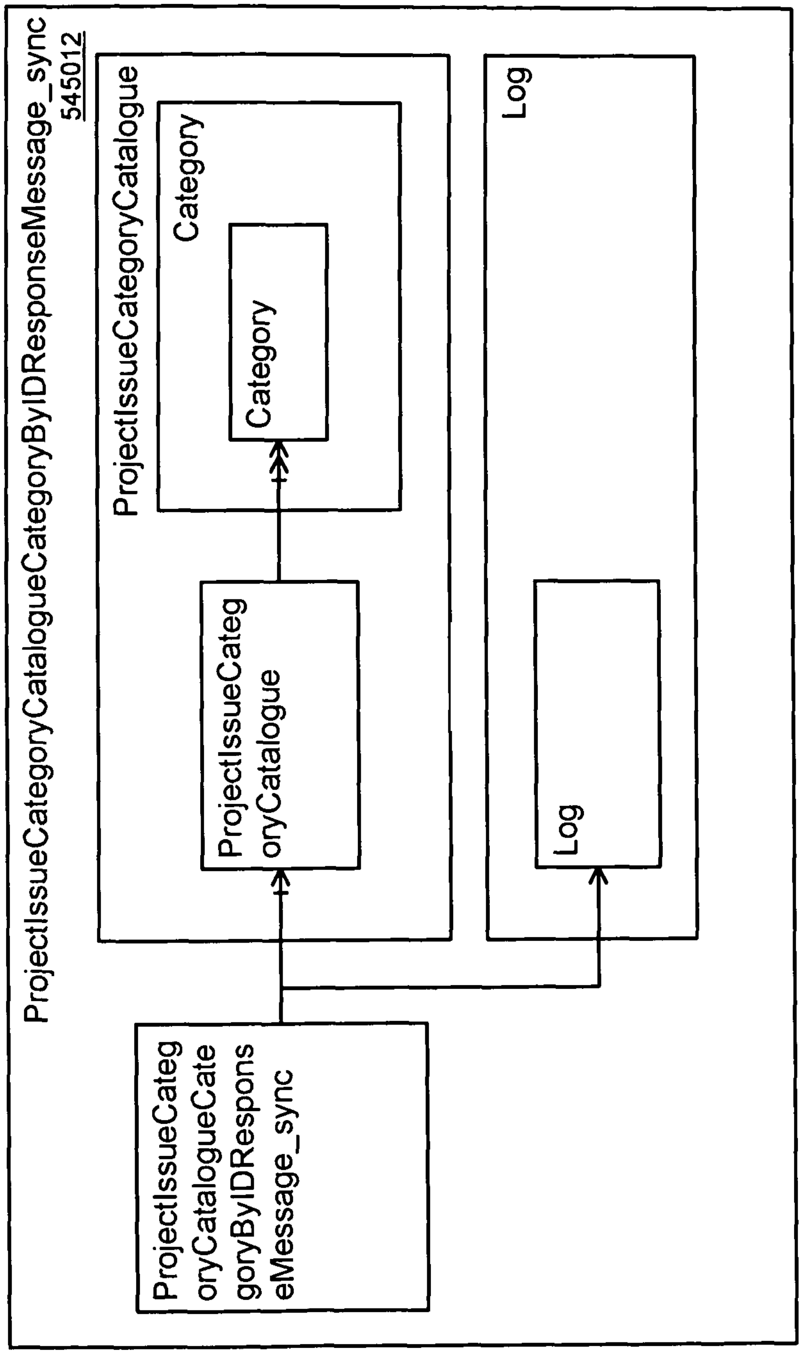
Figure 548:
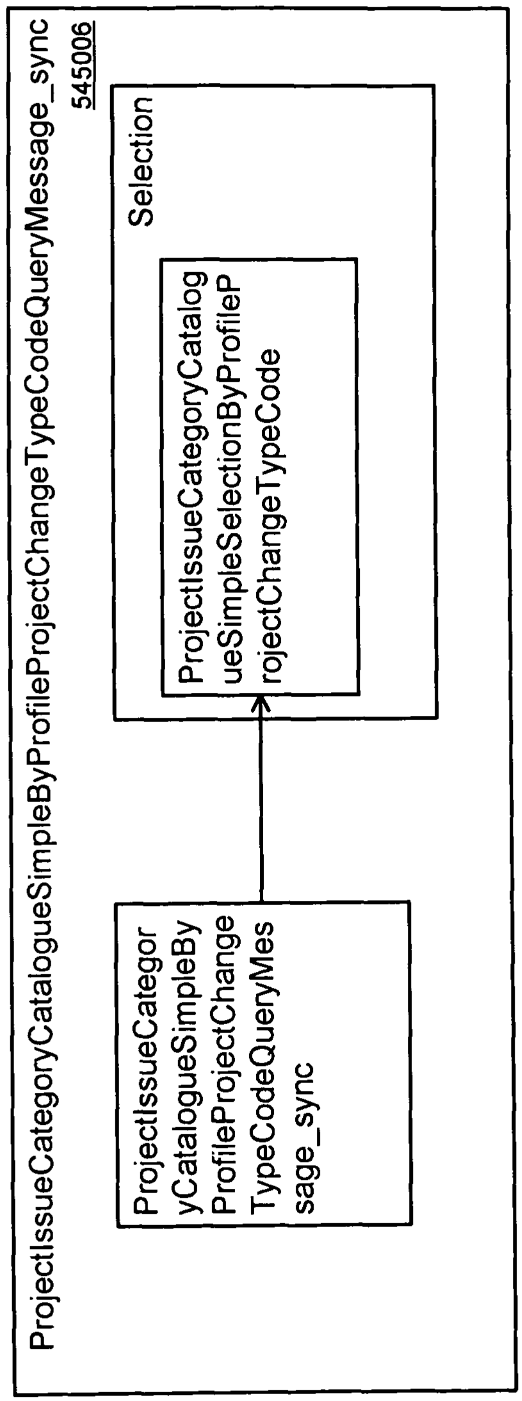
Figure 549:
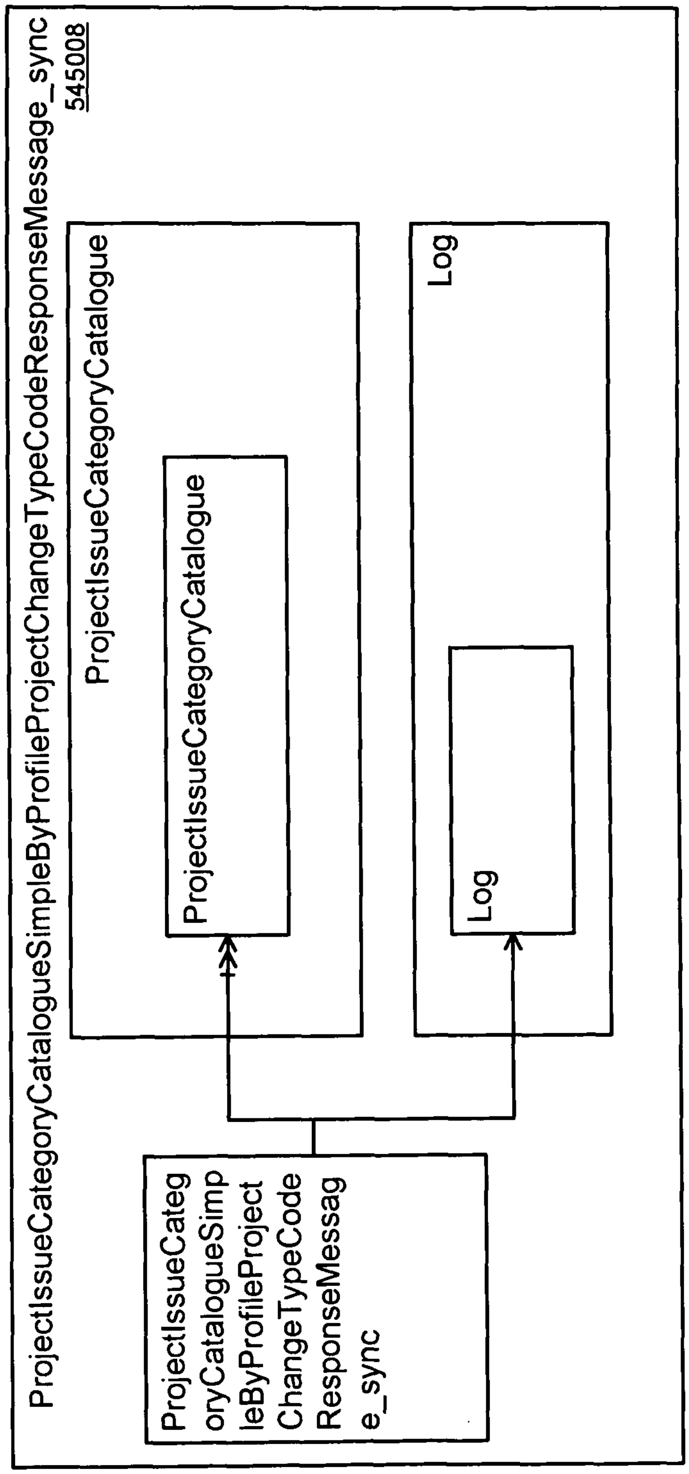
Figure 554:
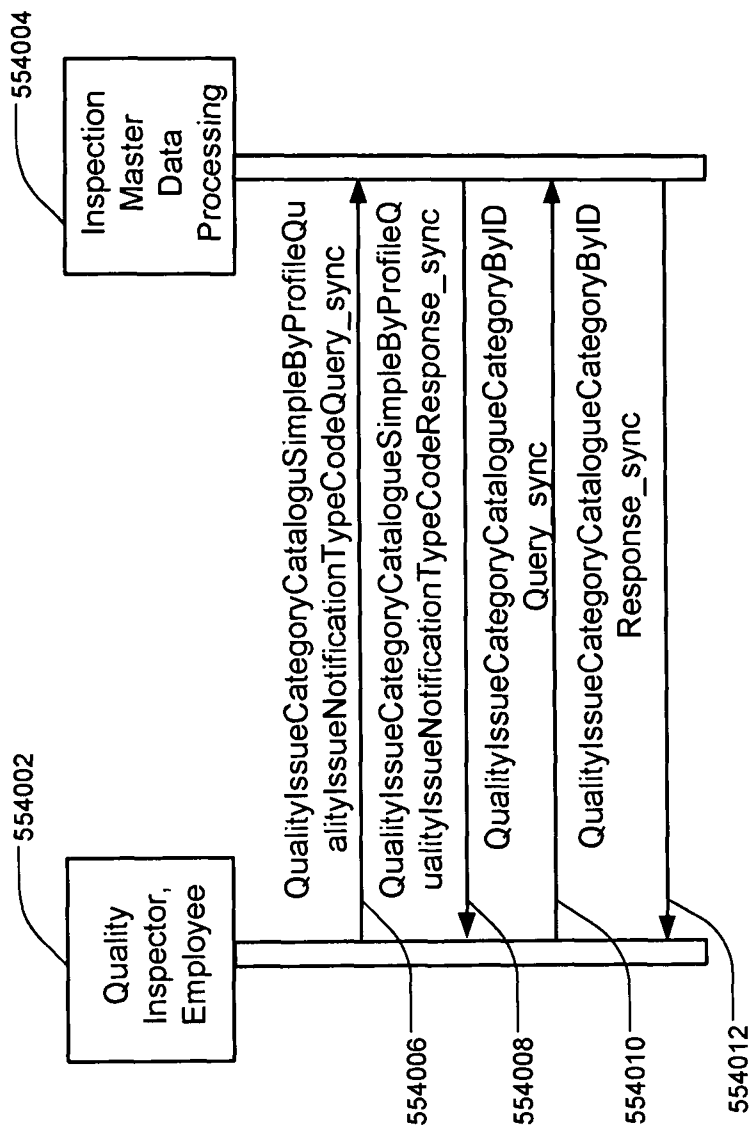
Figure 555:
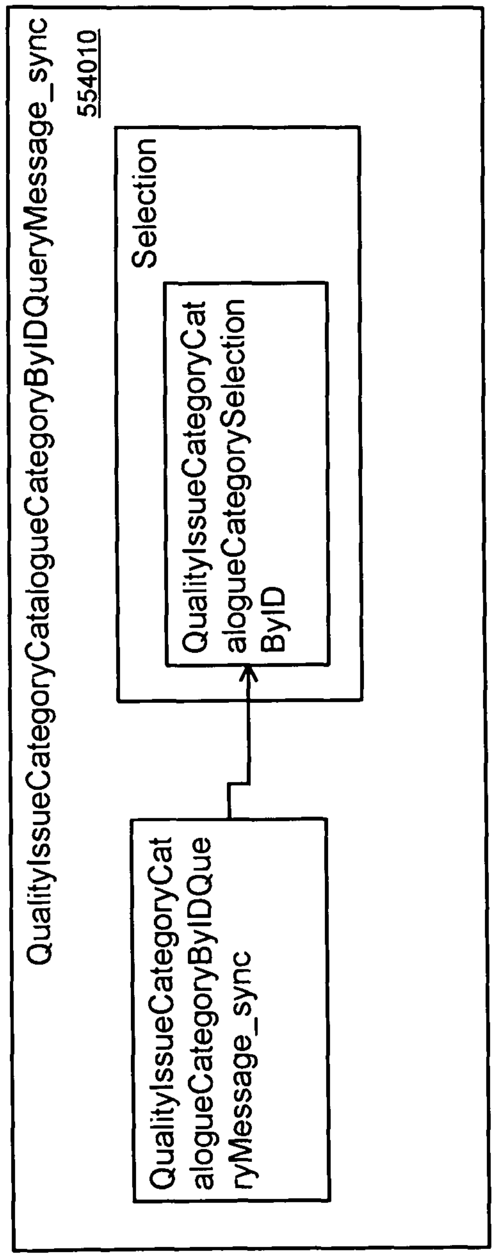
Figure 556:
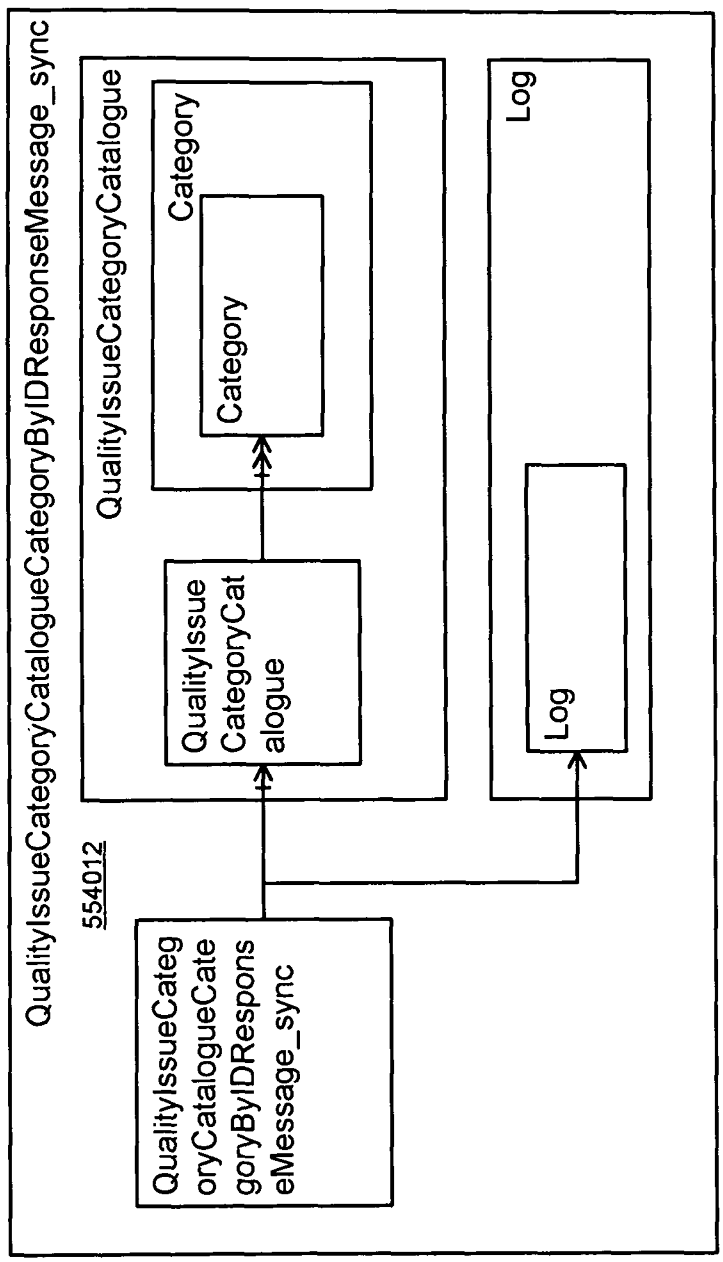
Figure 557:
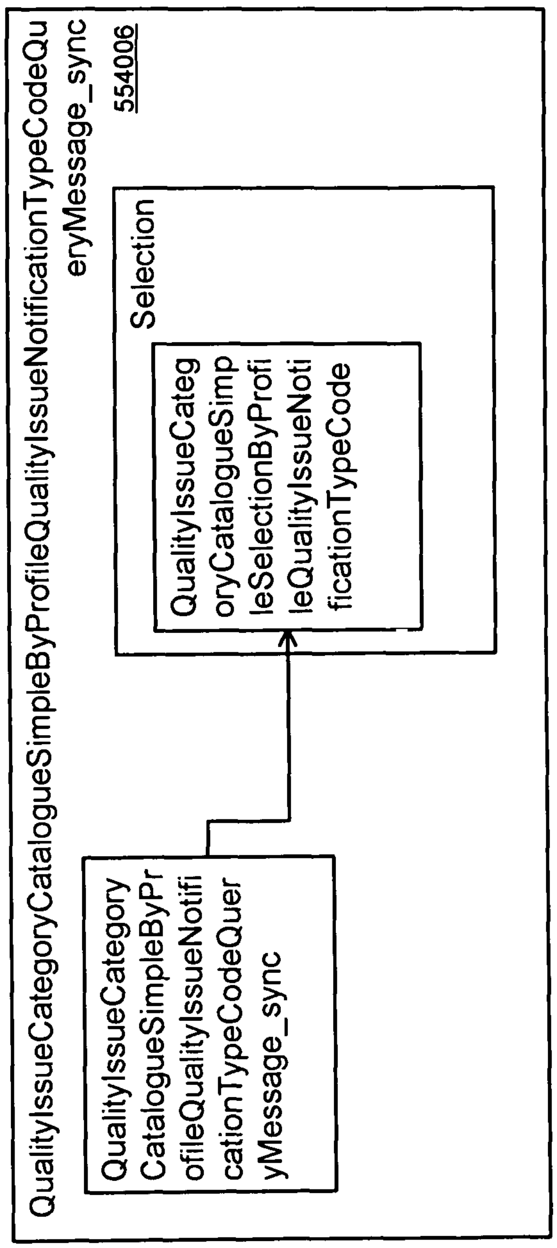
Figure 558:
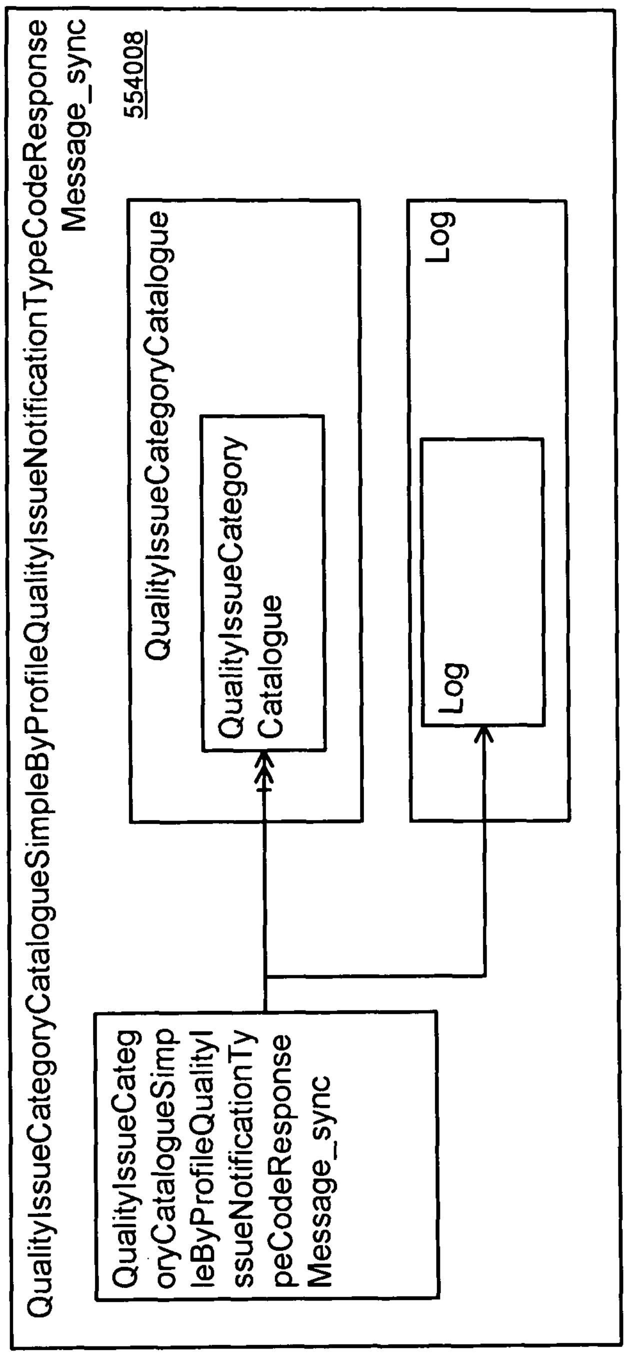
Figure 563:
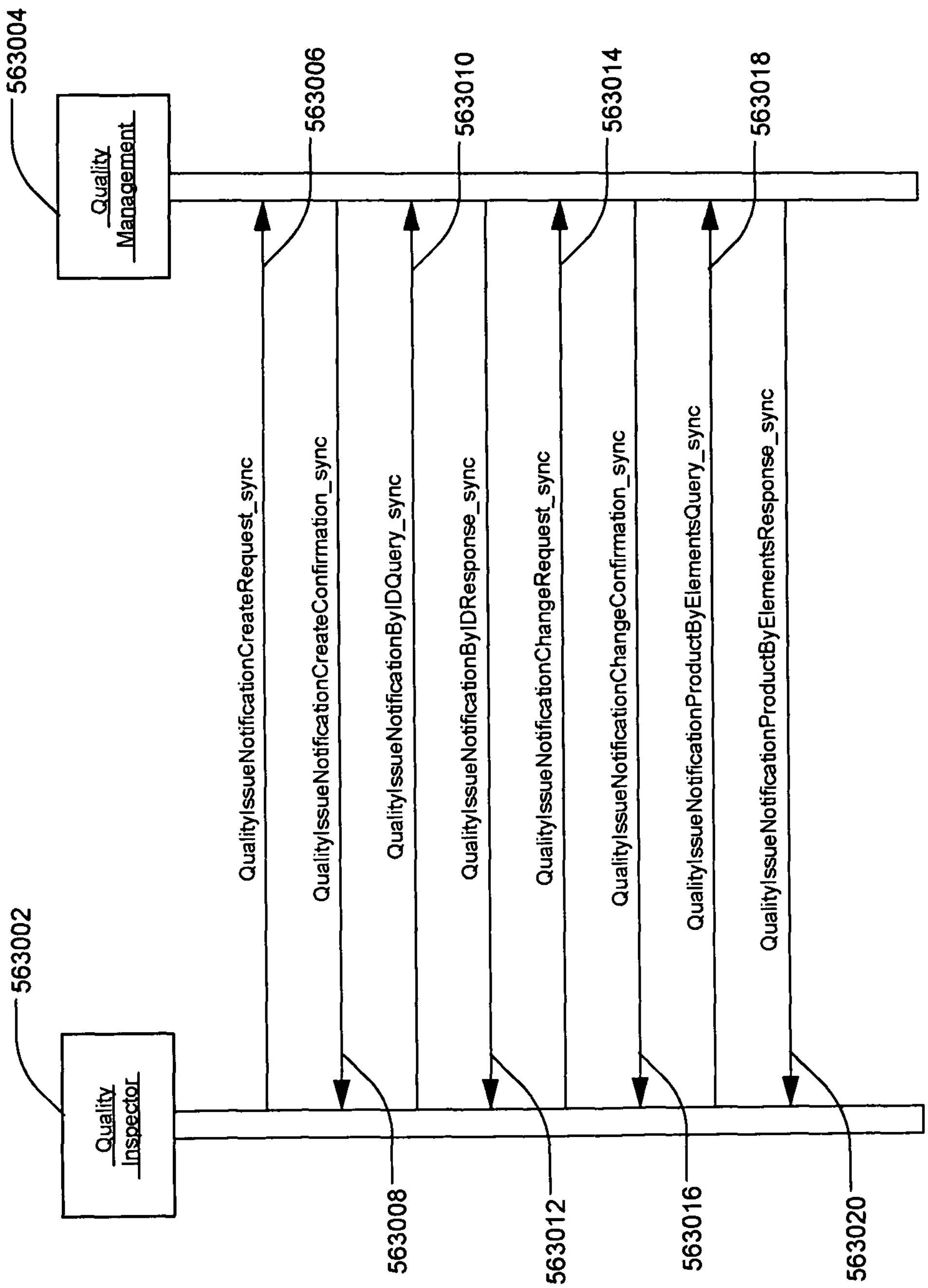
Figure 564:
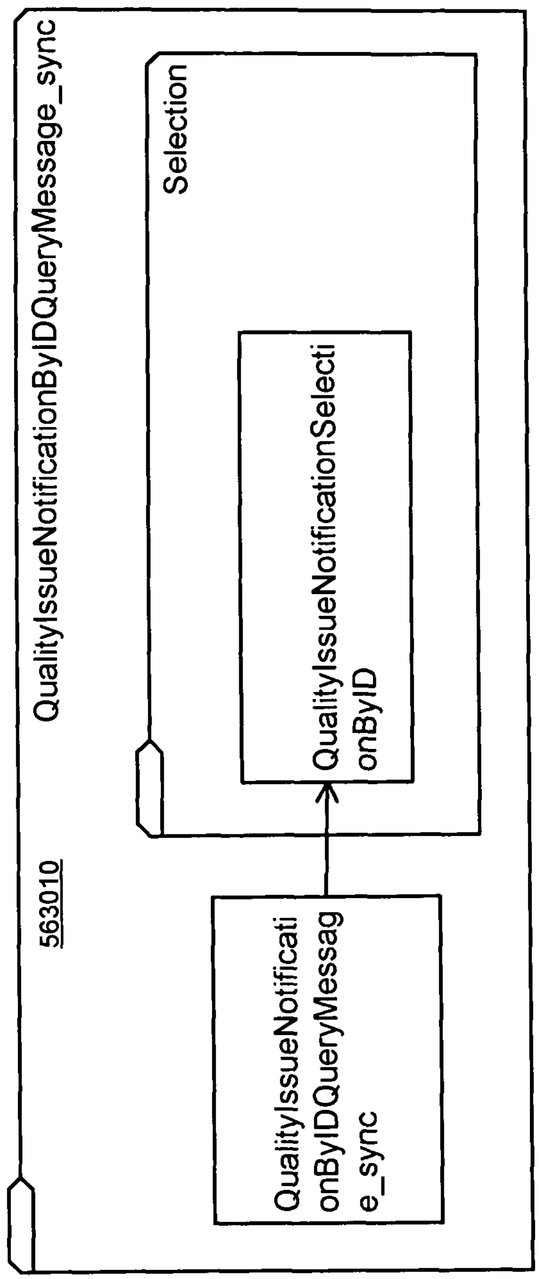
Figures 1, 565:
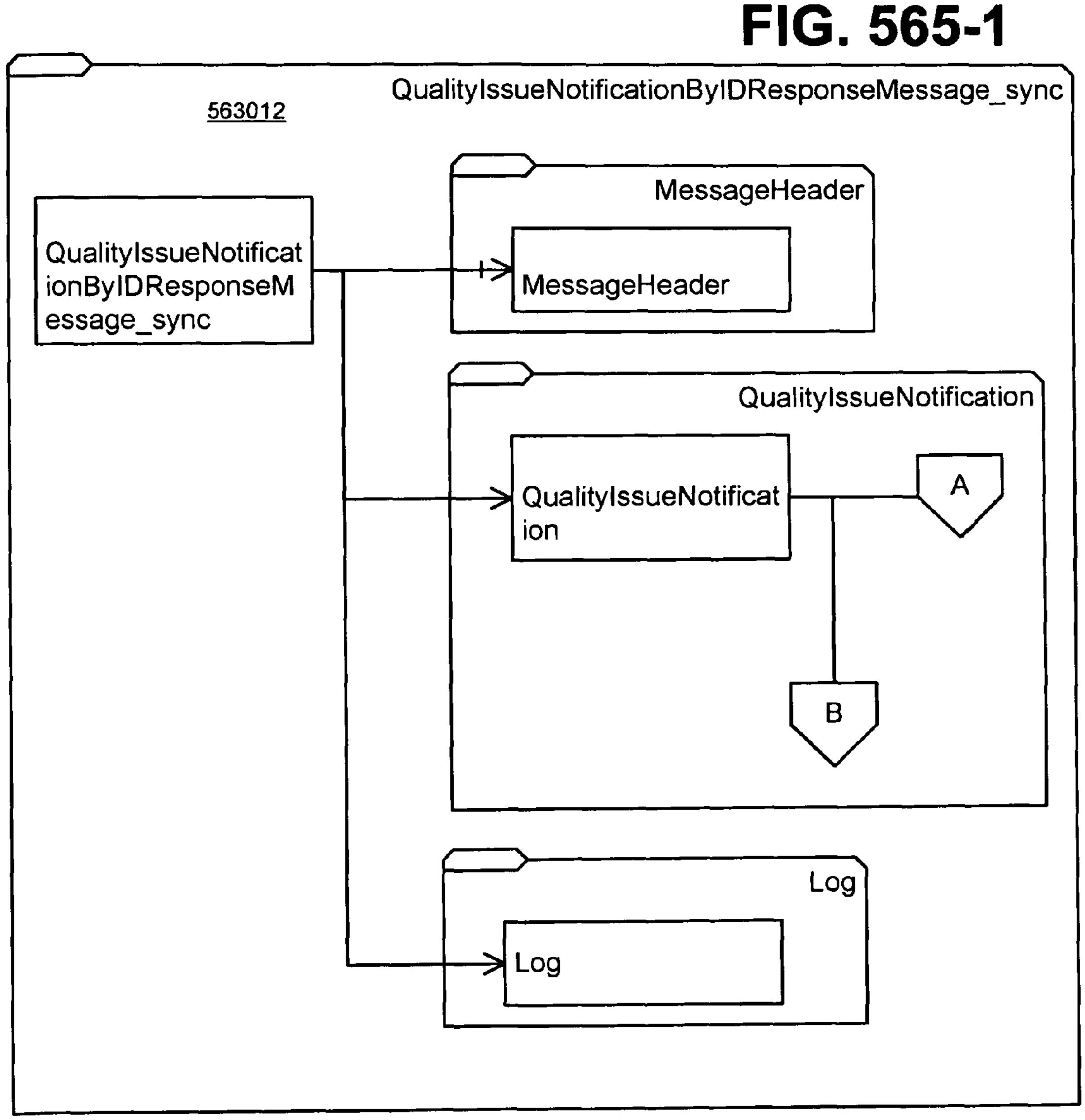
Figures 2, 565:
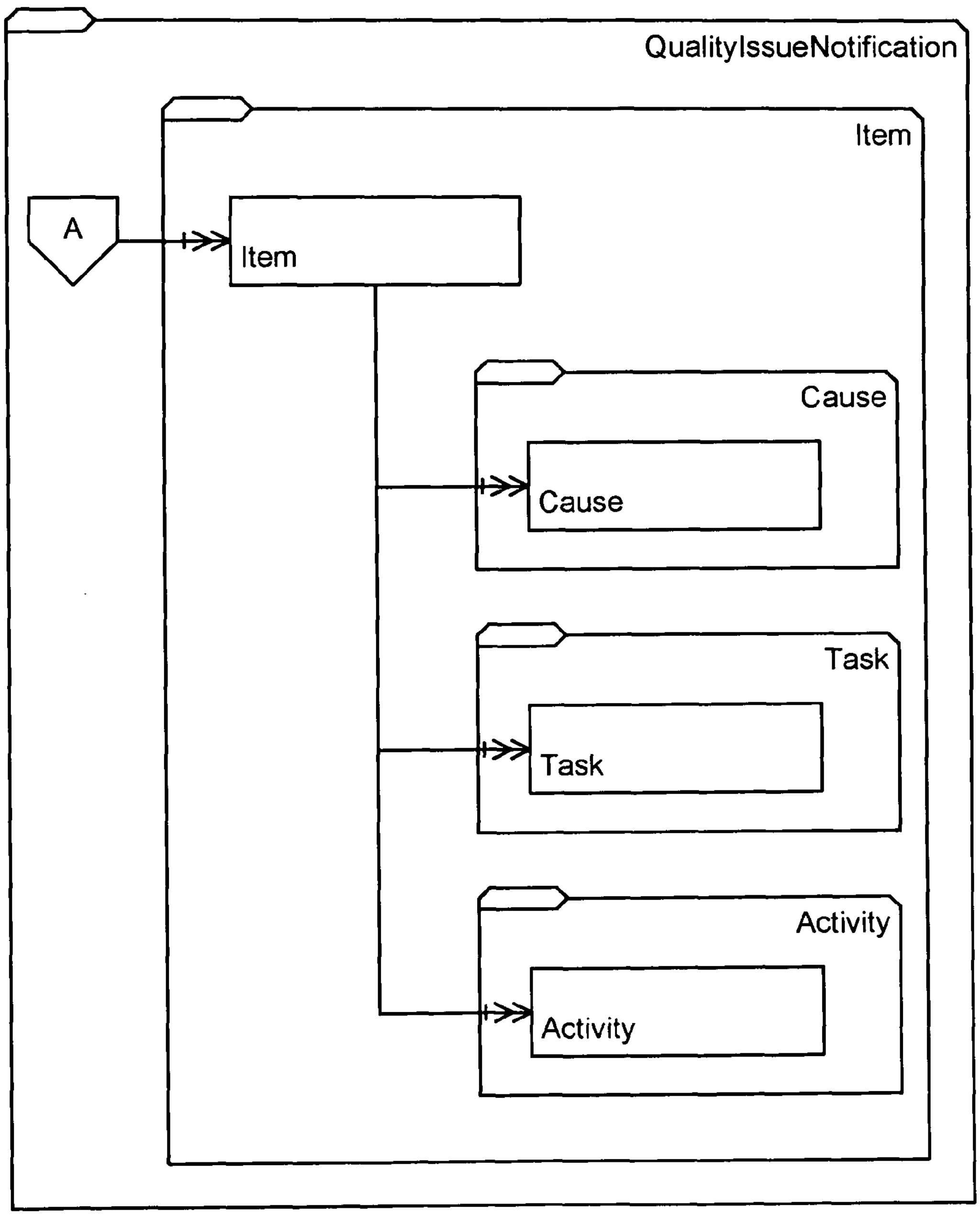
Figures 3, 565:
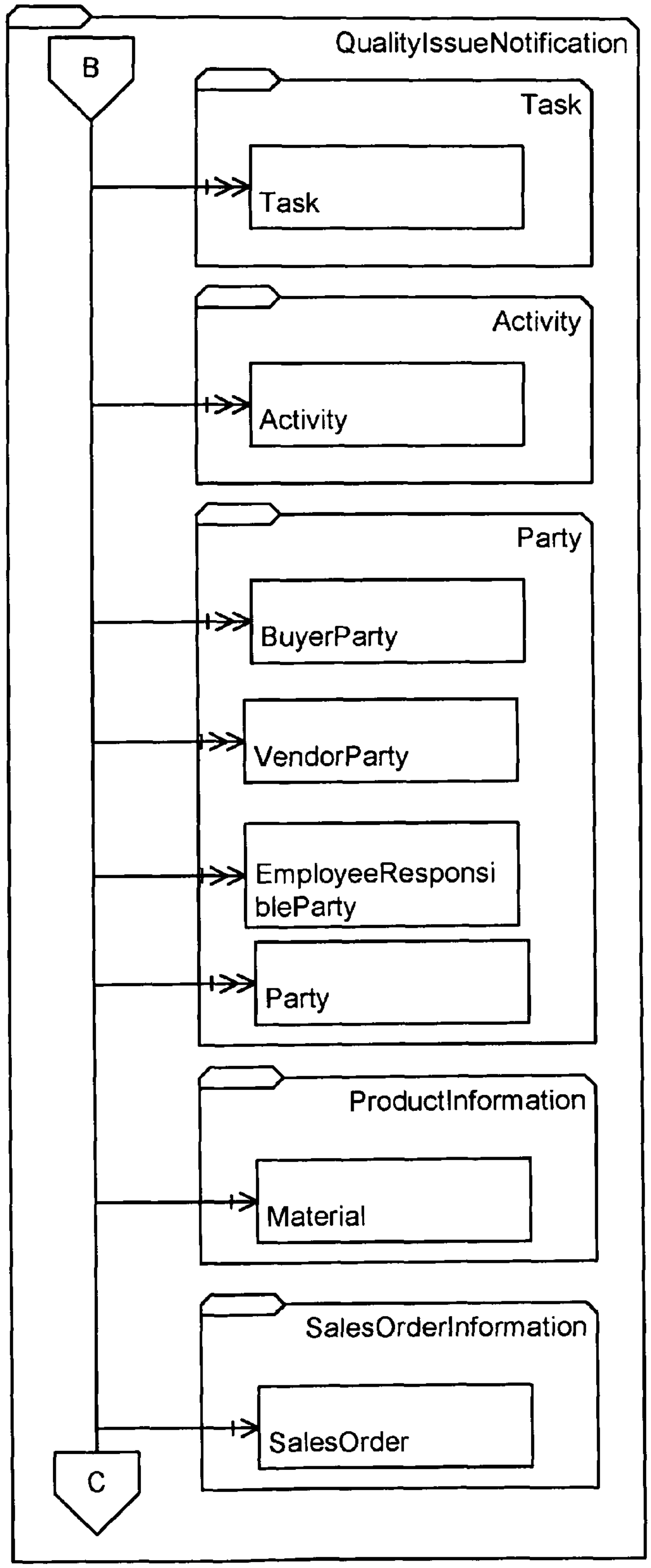
Figures 4, 565:
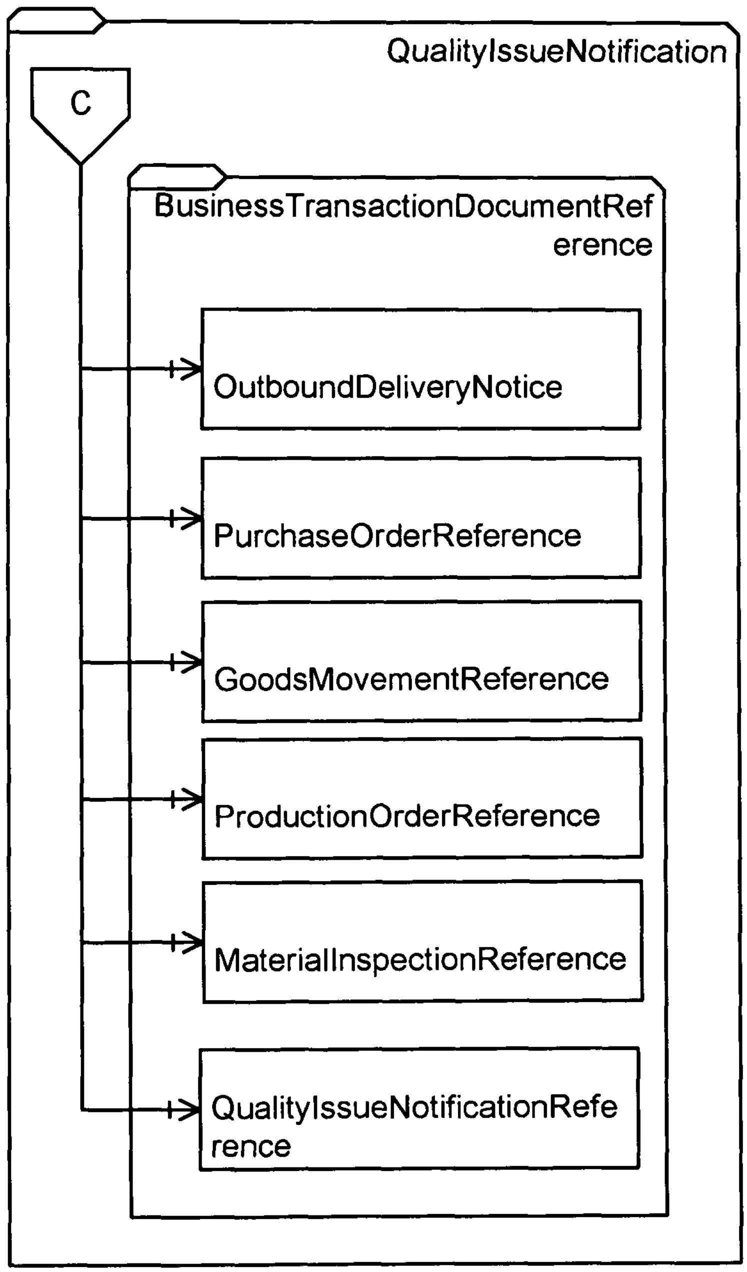
Figure 566:
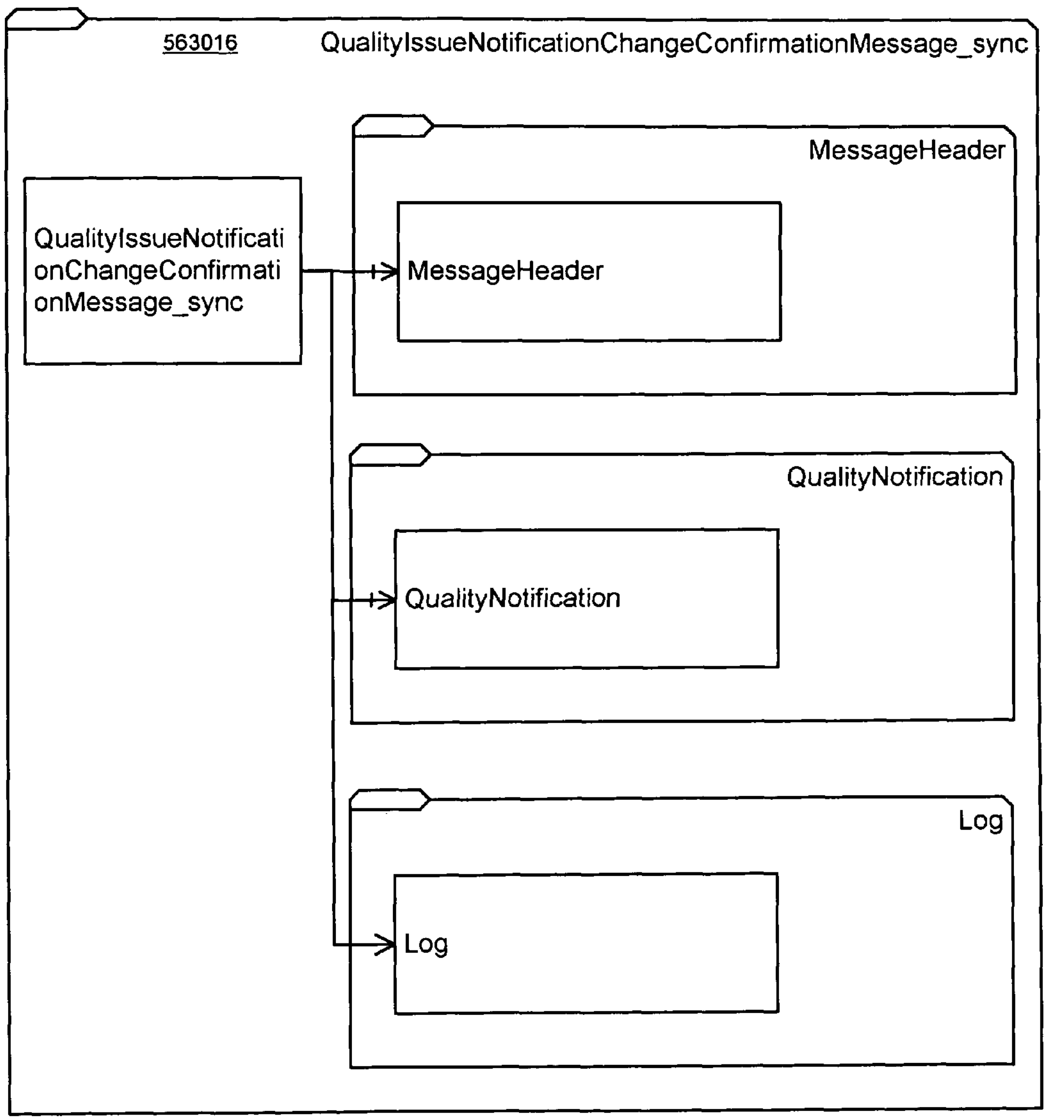
Figures 1, 567:
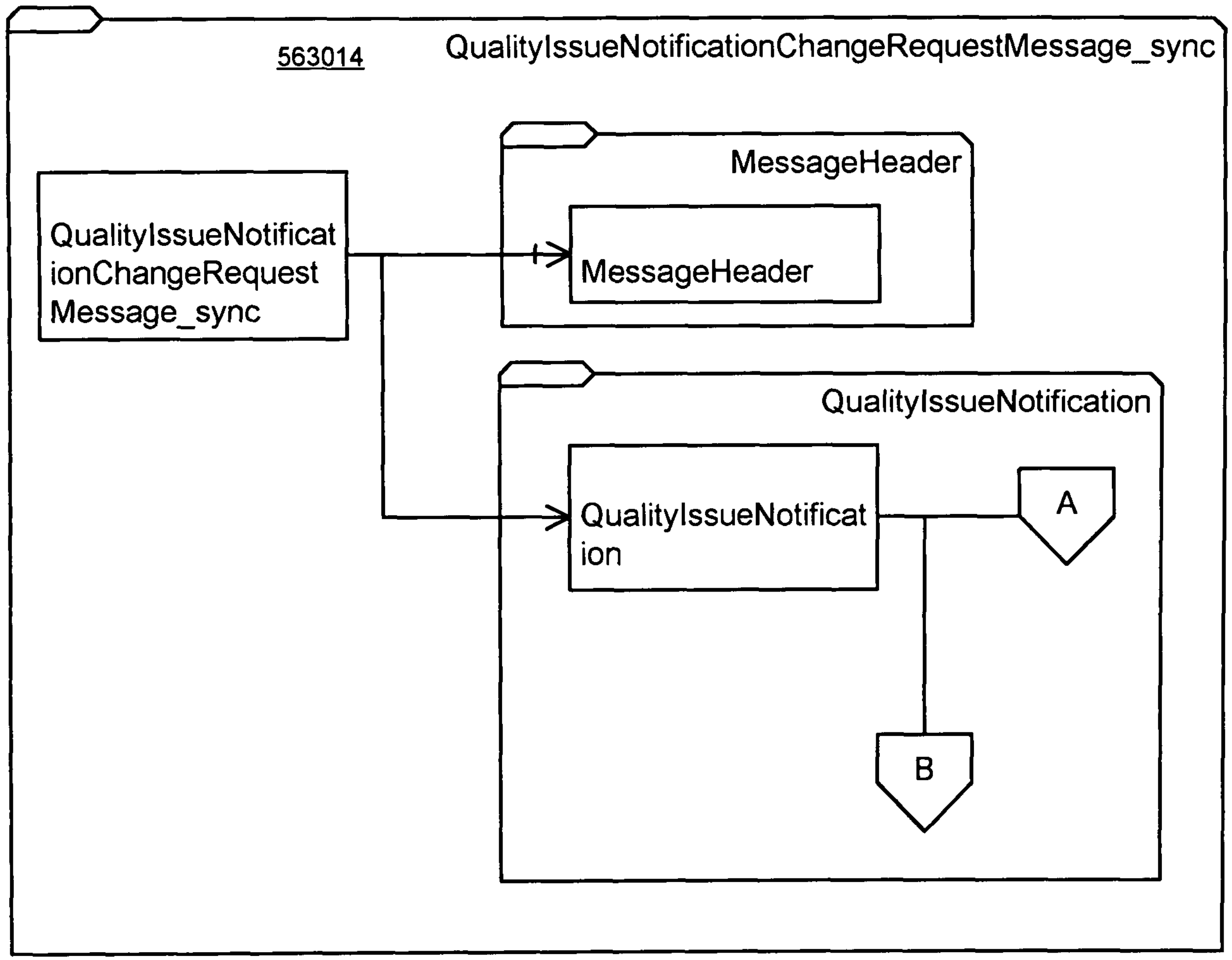
Figures 2, 567:
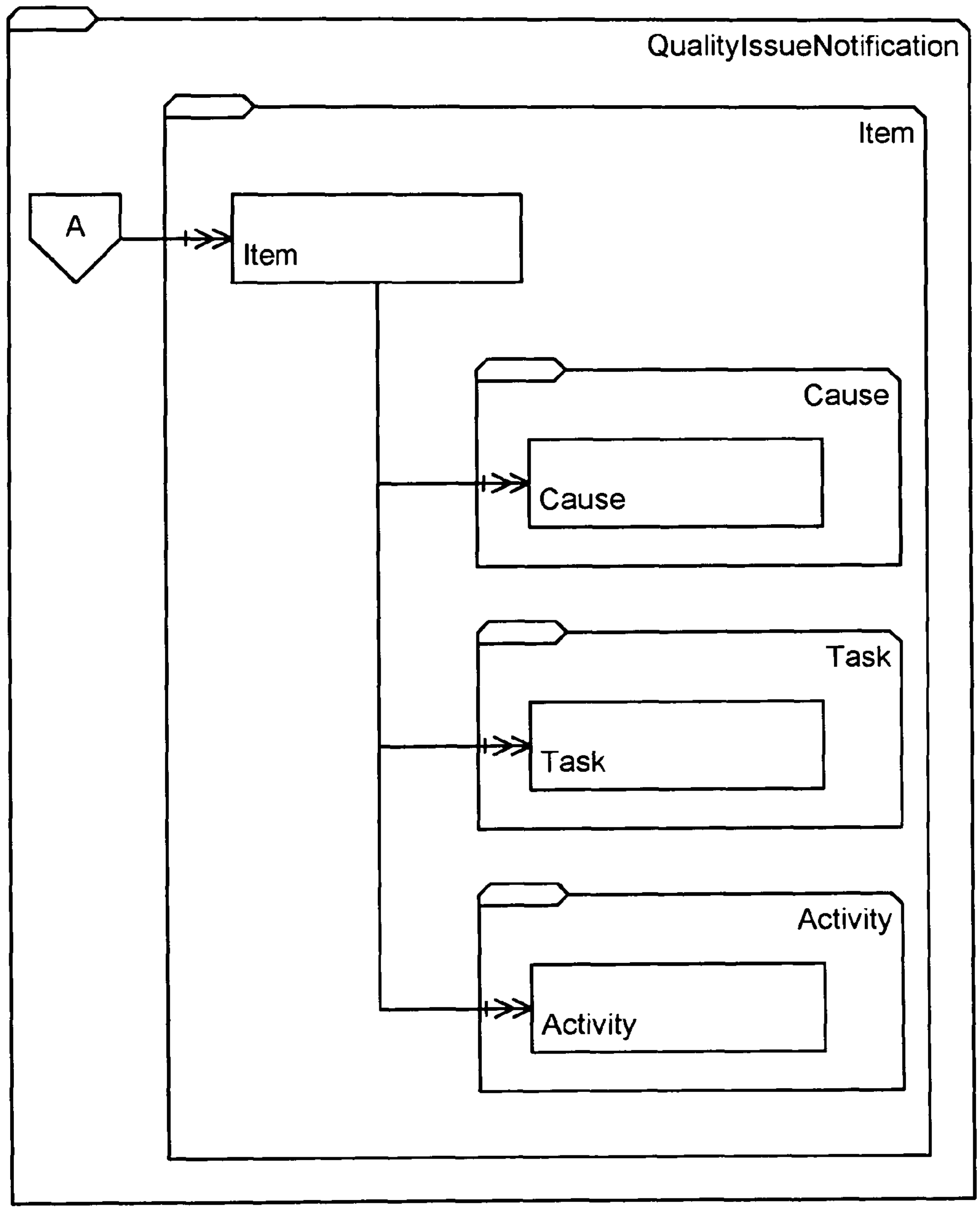
Figures 3, 567:
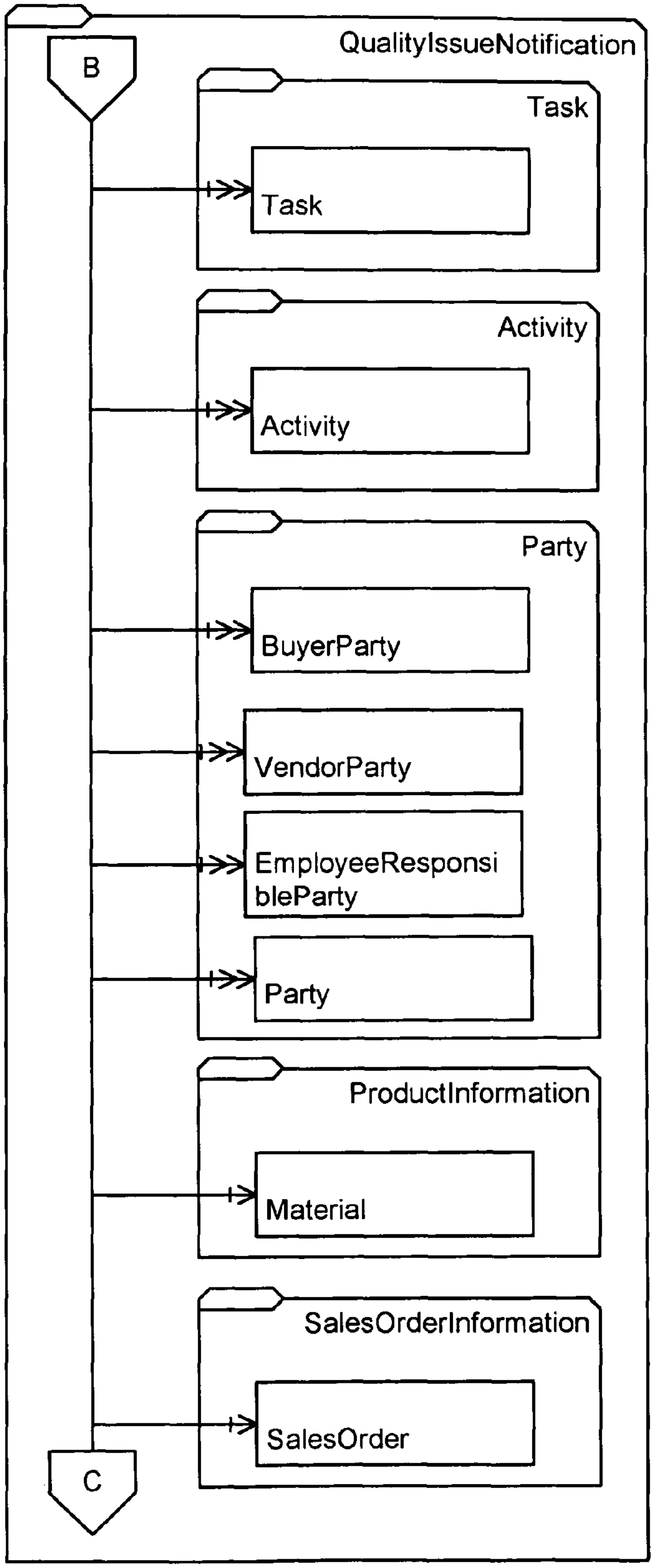
Figures 4, 567:
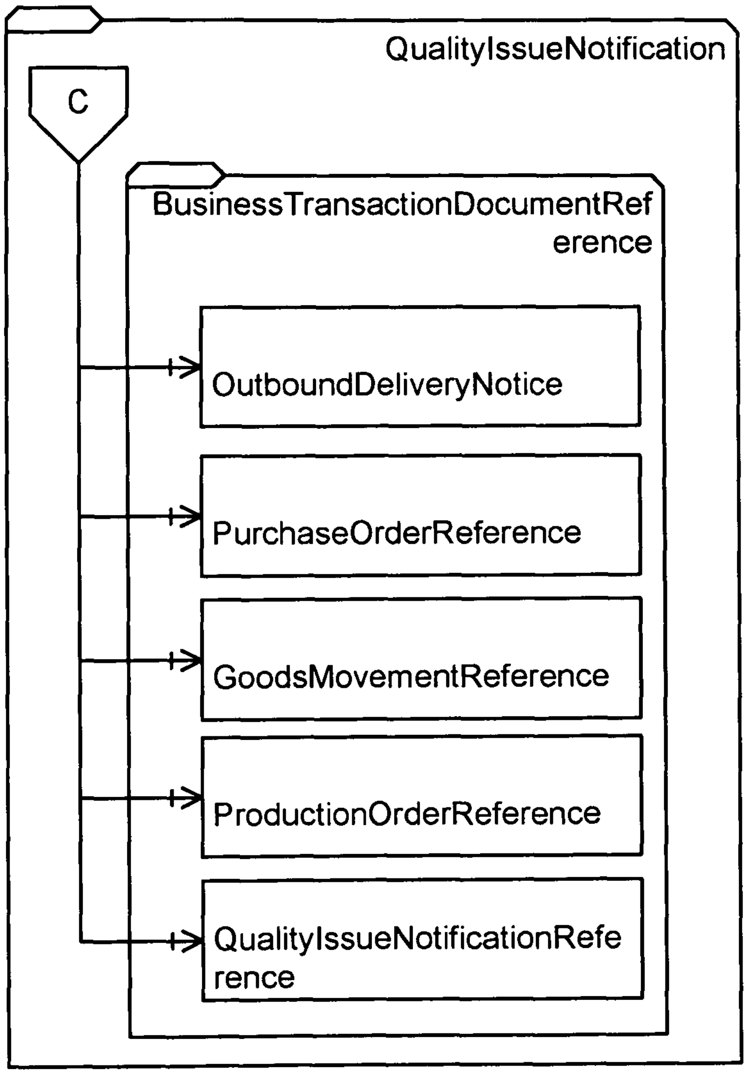
Figure 568:
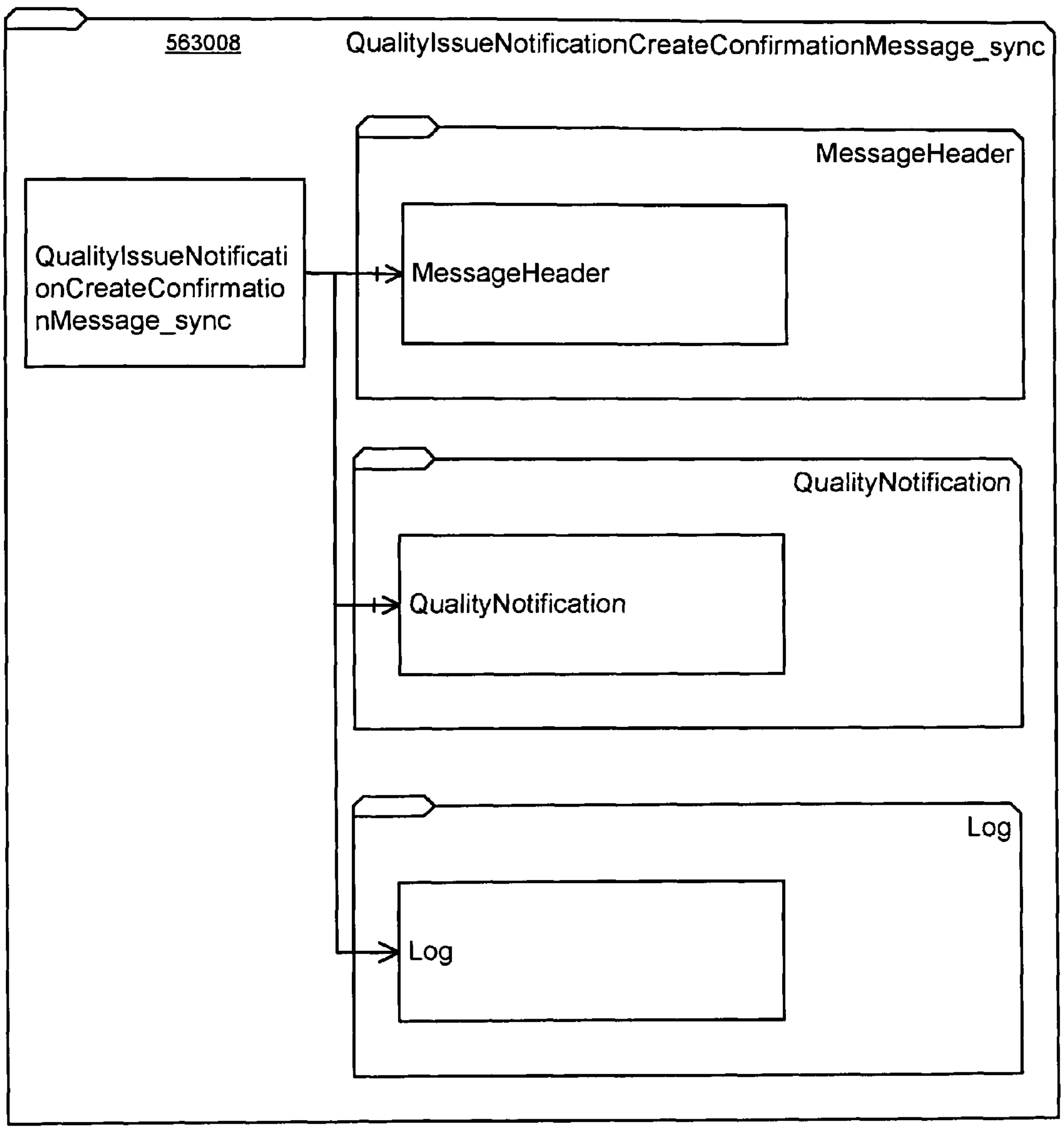
Figures 1, 569:
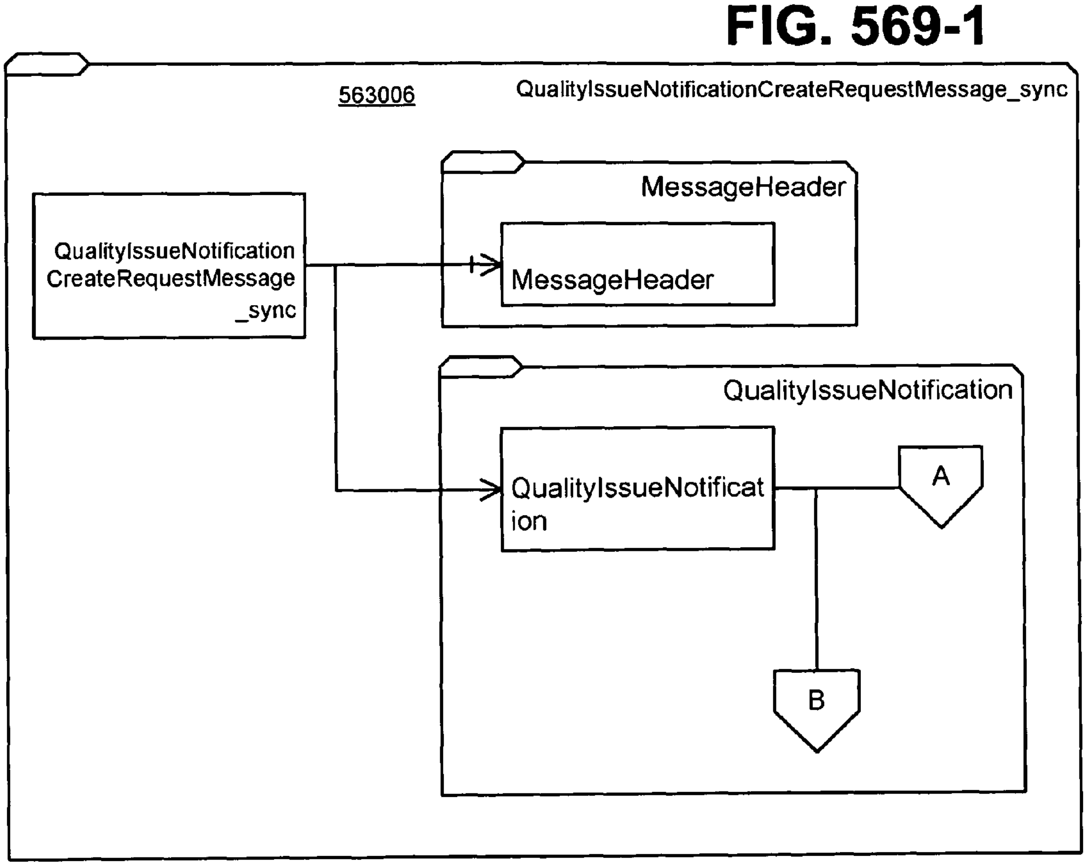
Figures 2, 569:
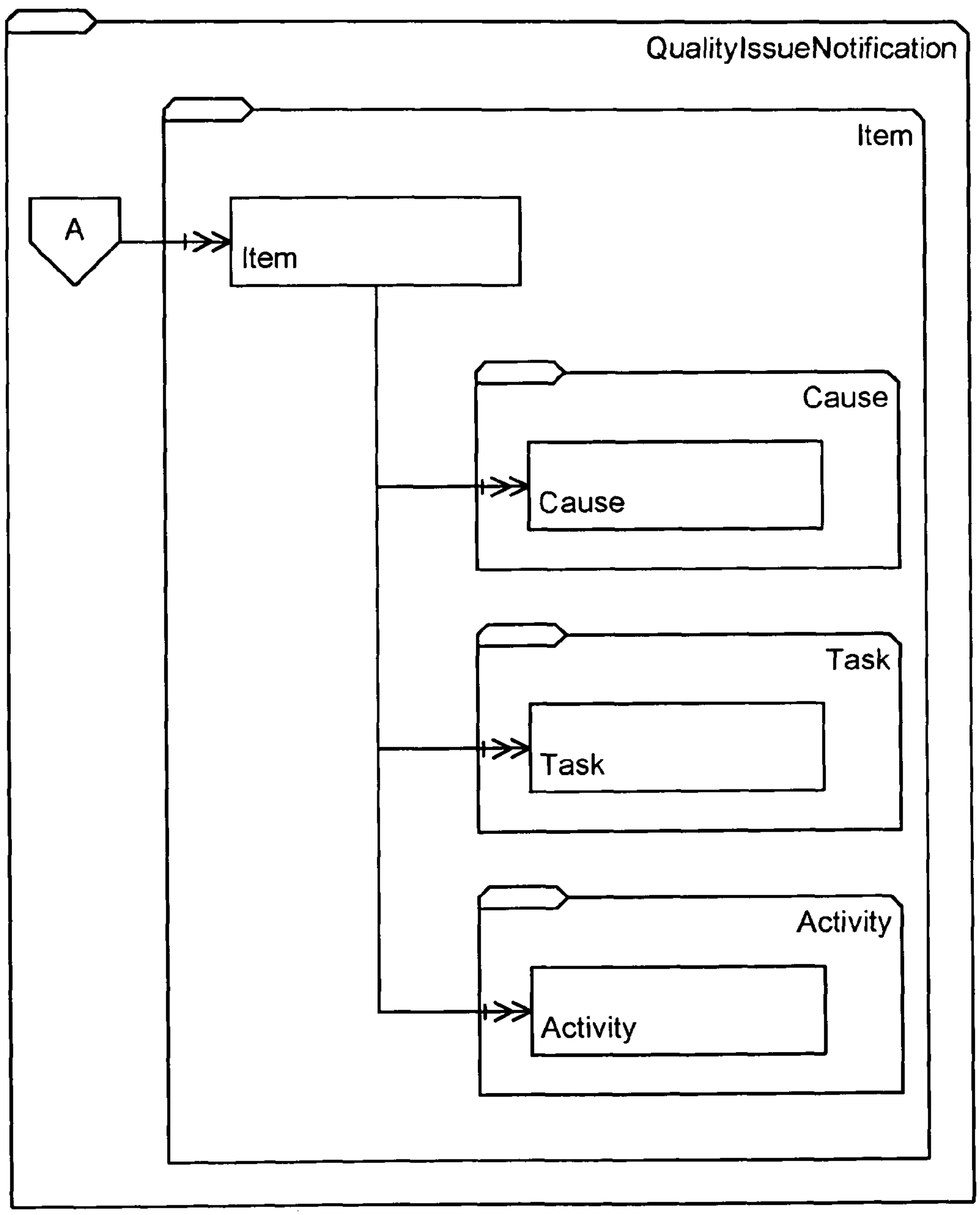
Figures 3, 569:
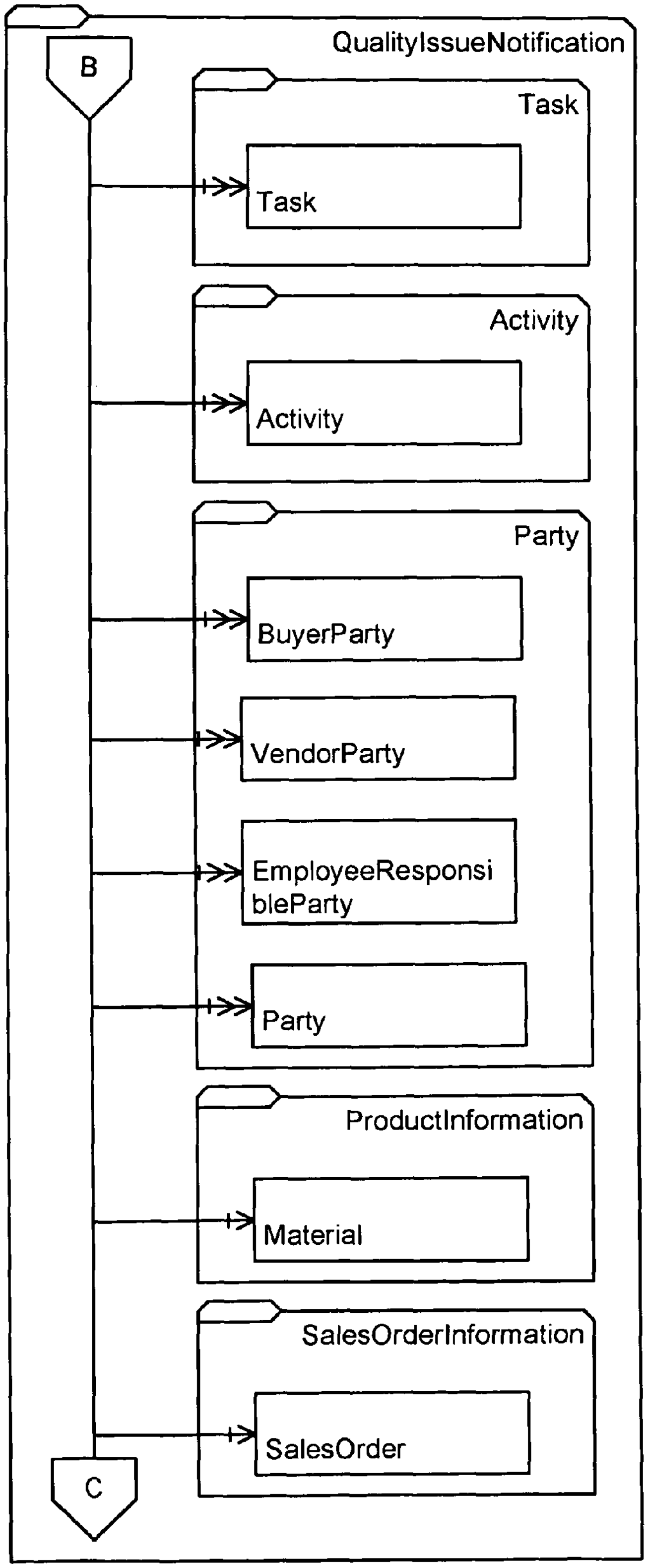
Figures 4, 569:
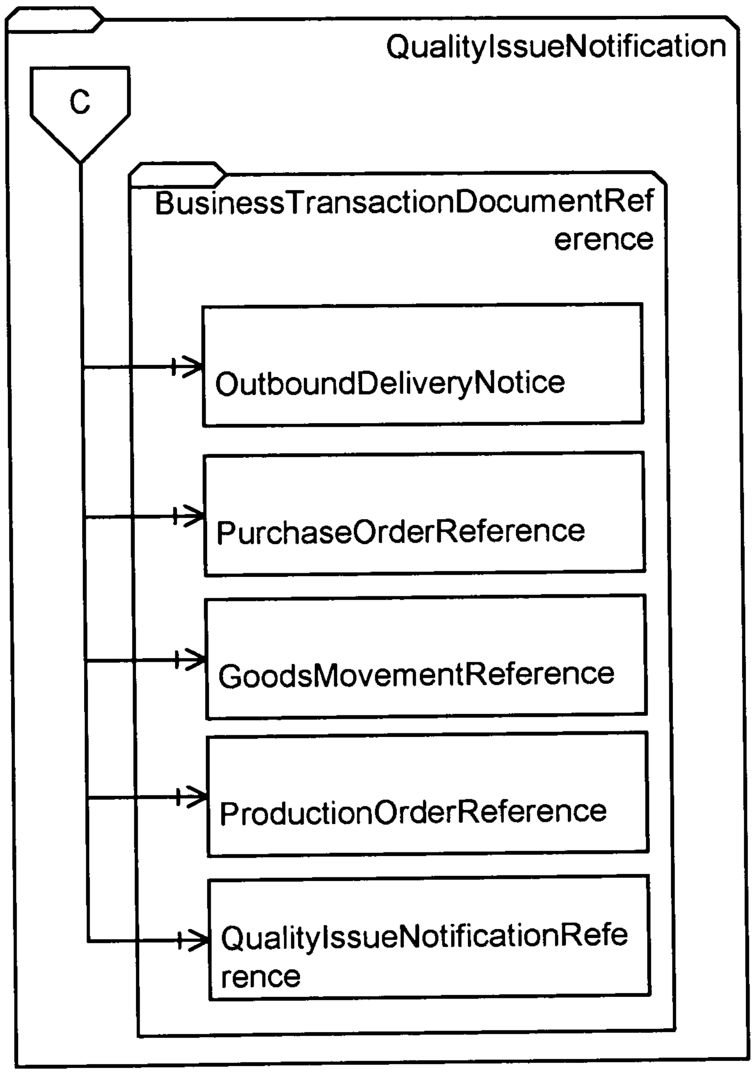
Figure 570:
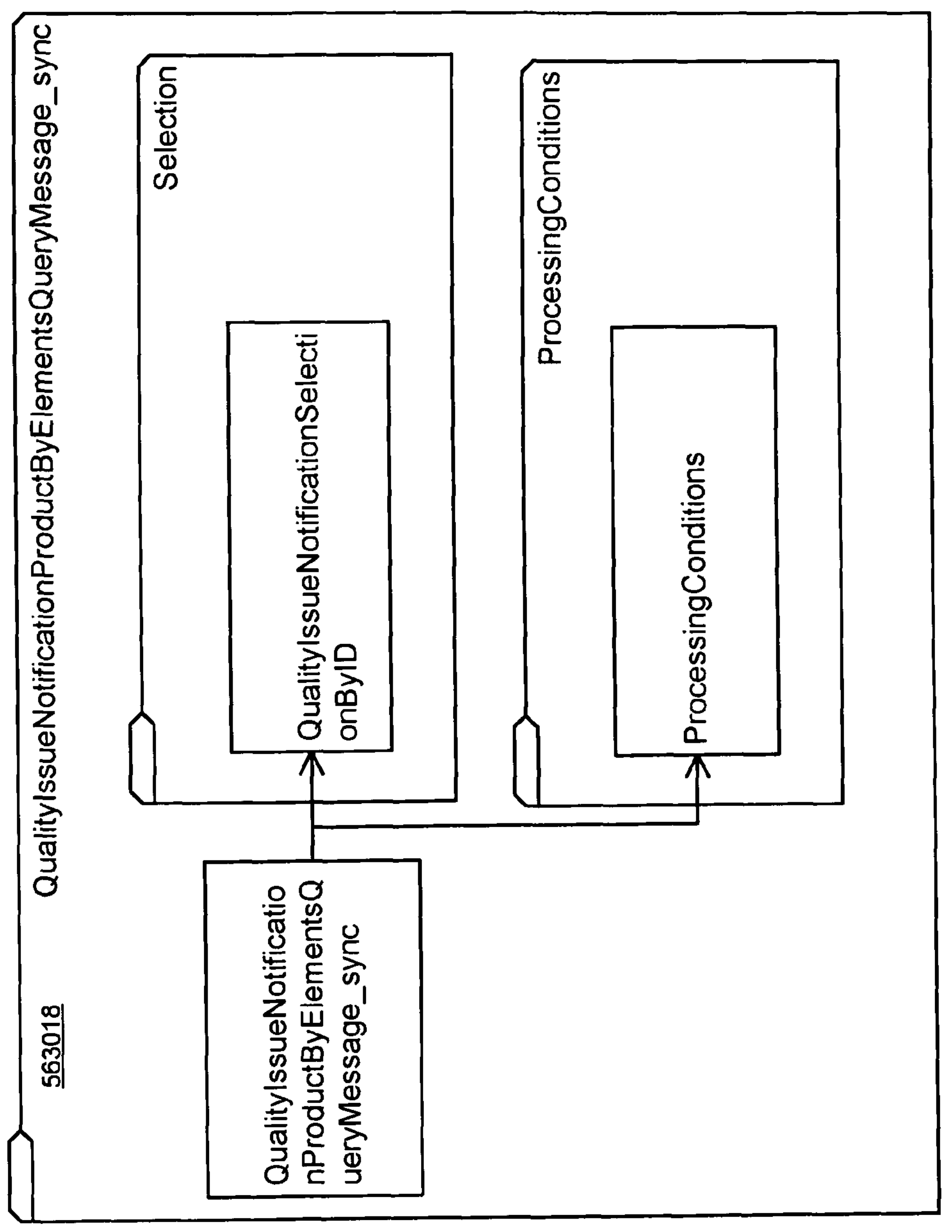
Figures 1, 571:
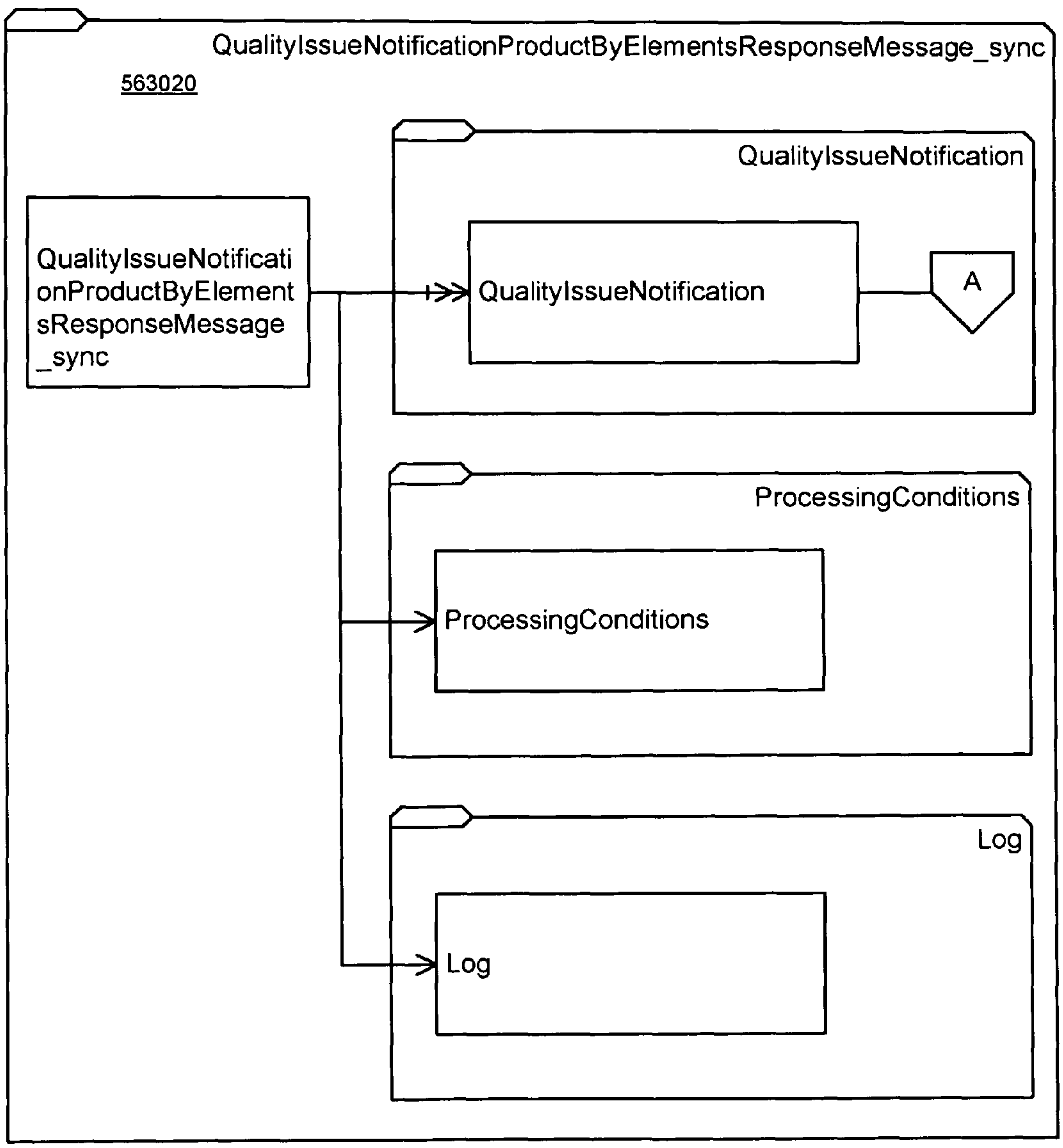
Figures 2, 571:
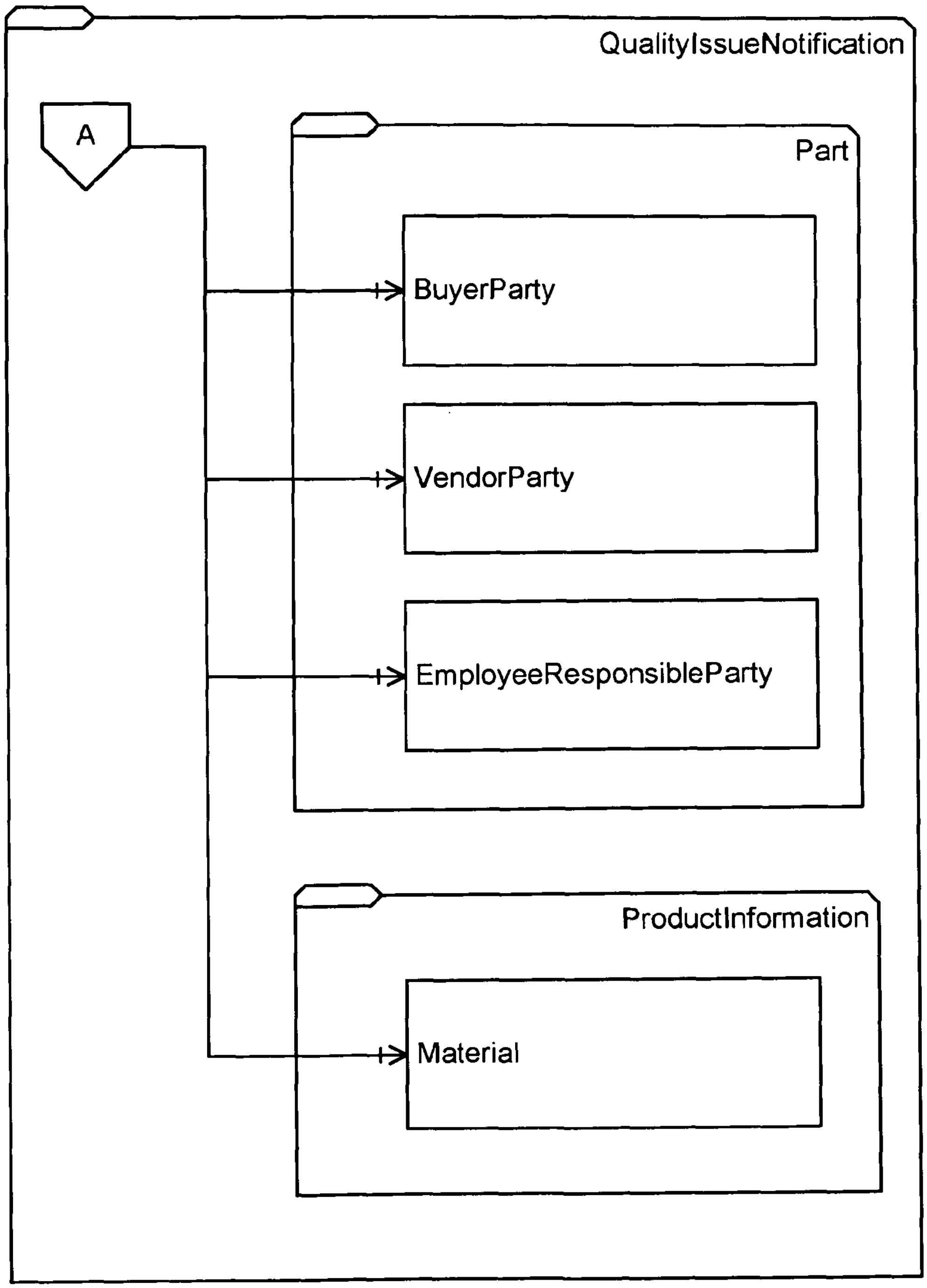
Figure 580:
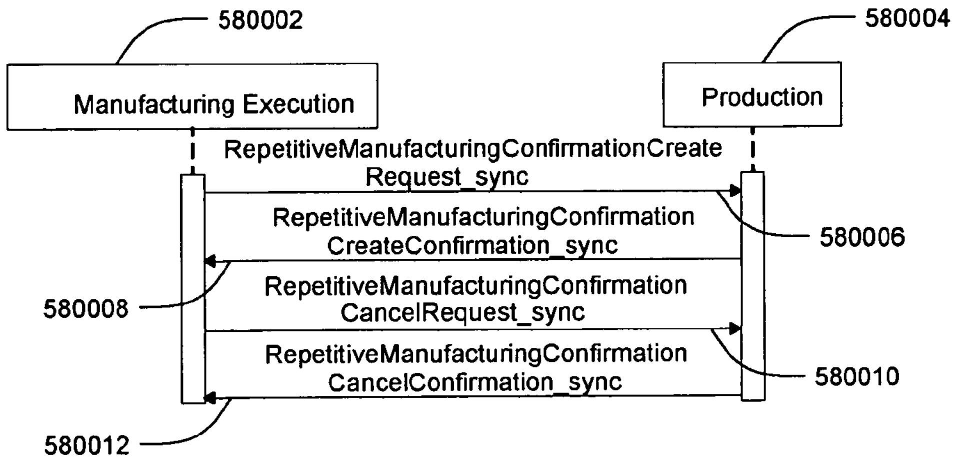
Figure 581:
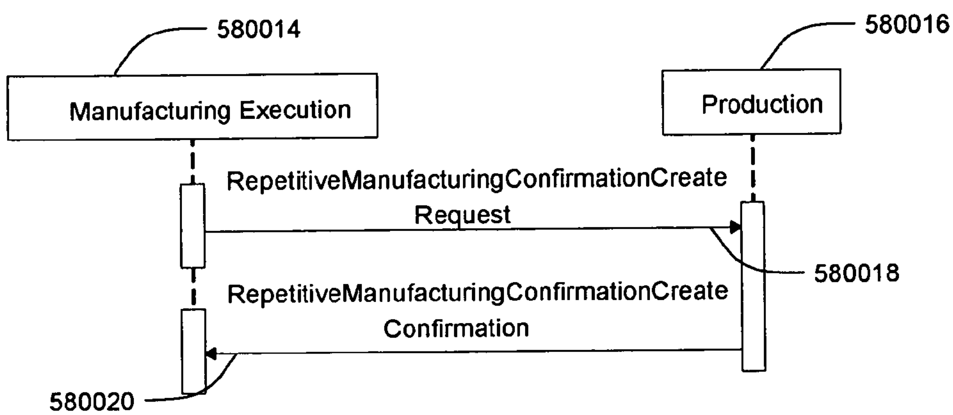
Figure 582:
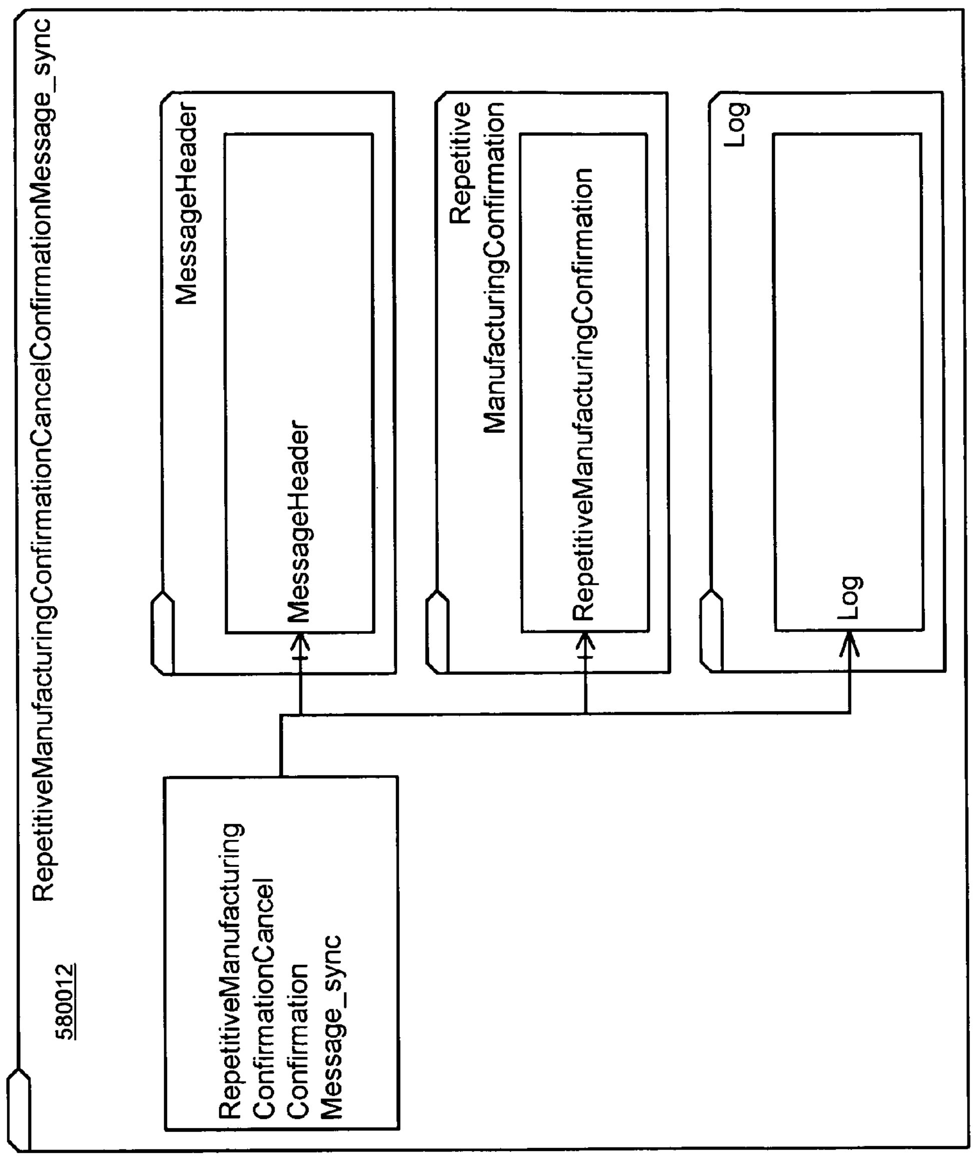
Figure 583:
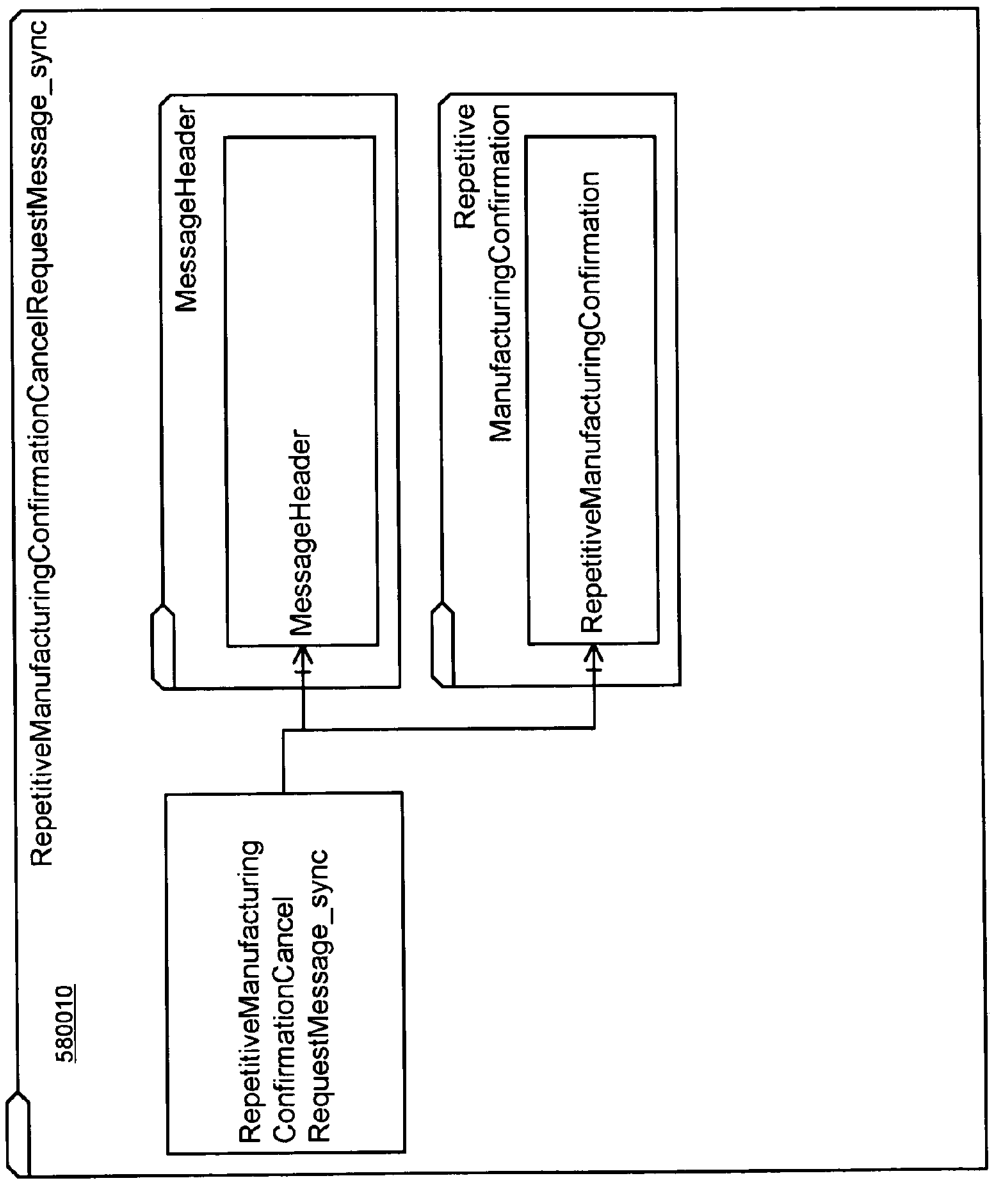
Figure 584:
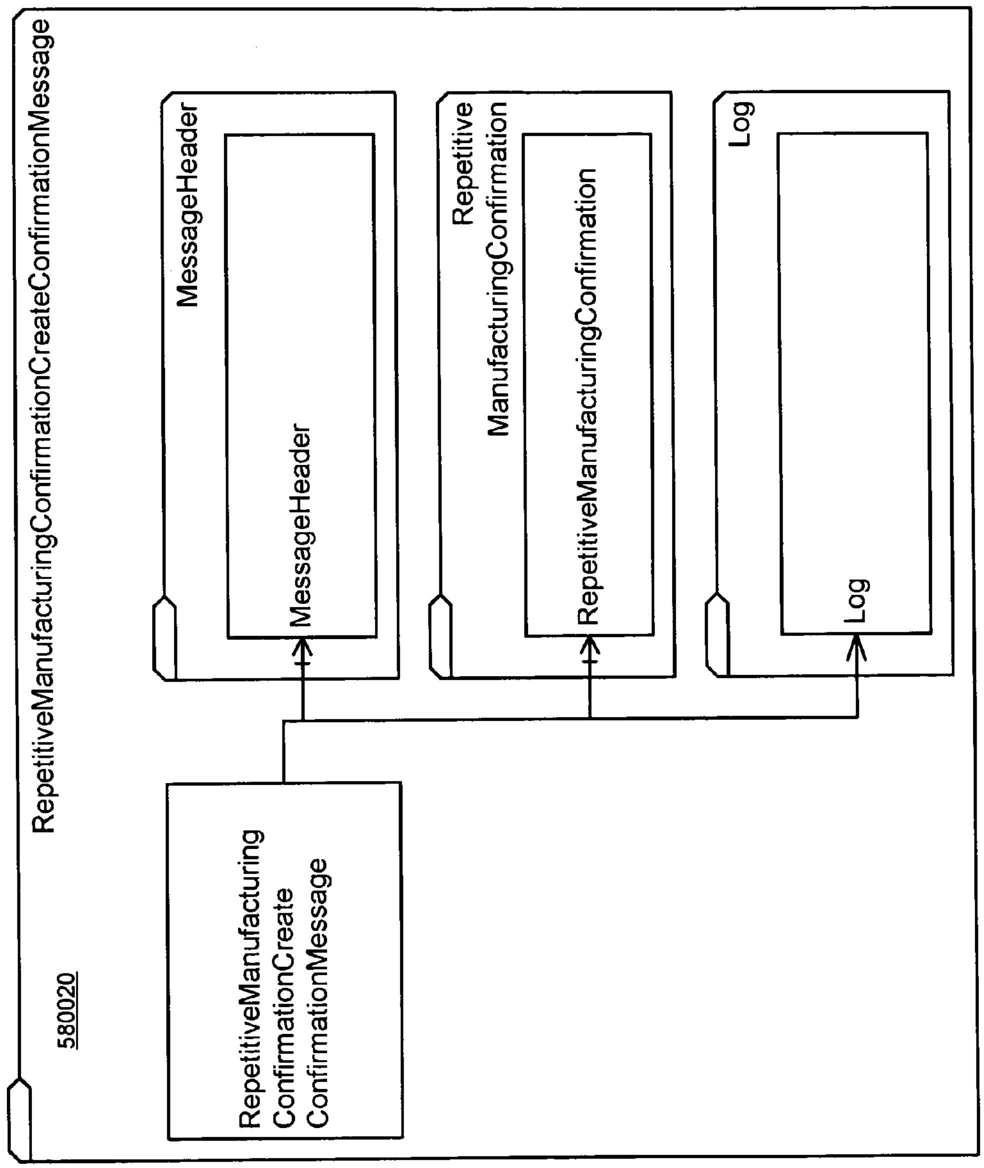
Figure 585:
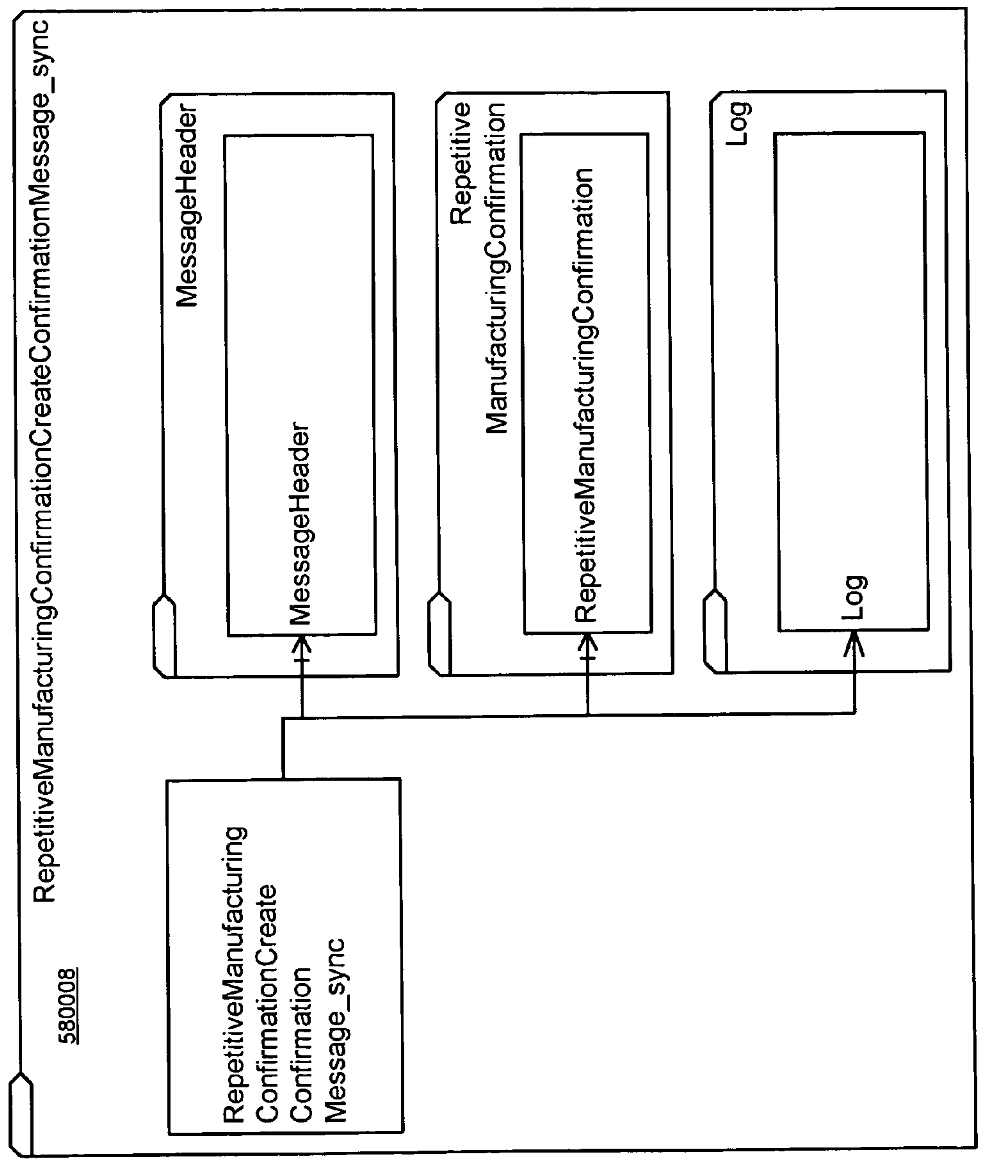
Figure 586:
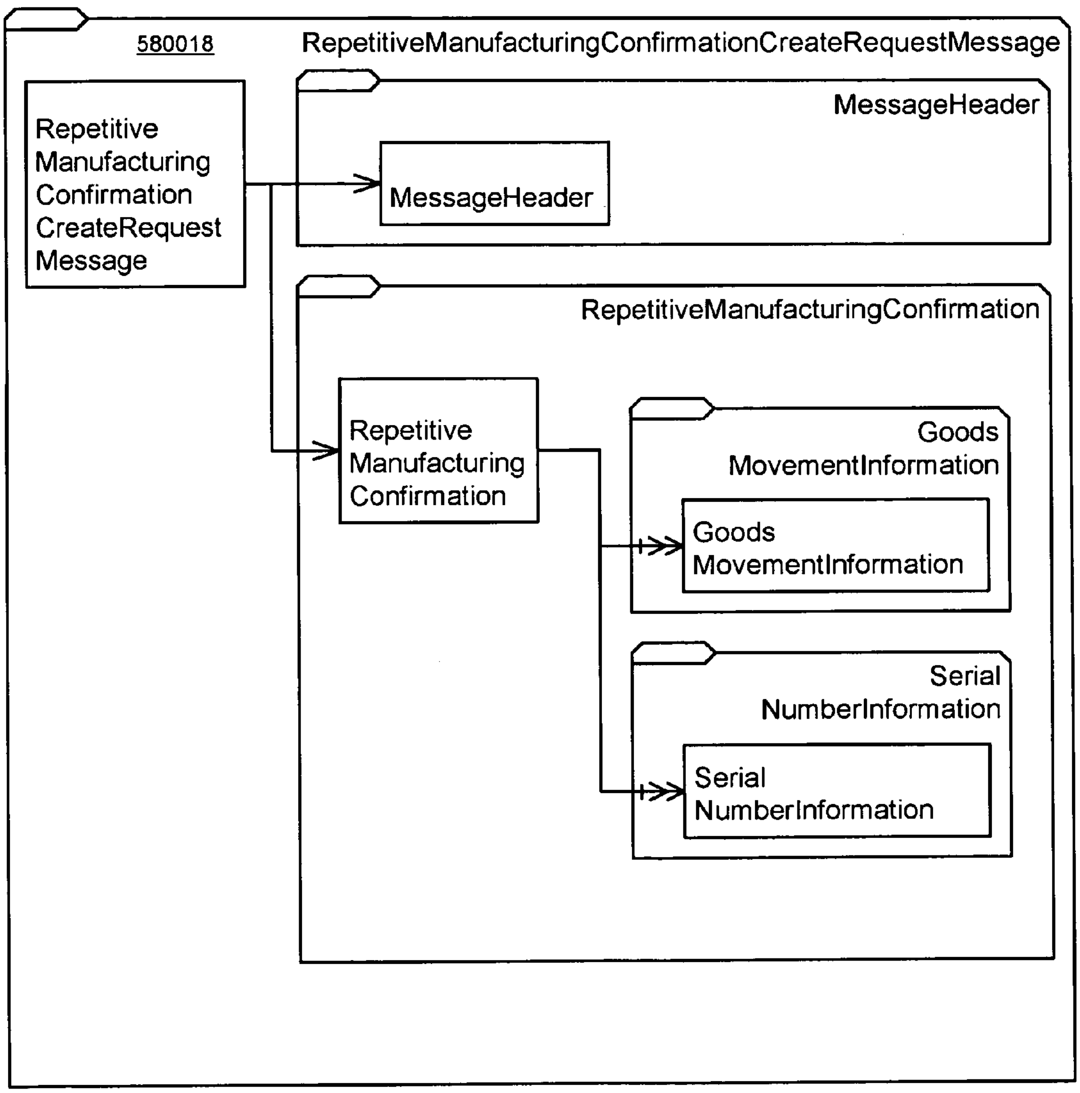
Figure 587:
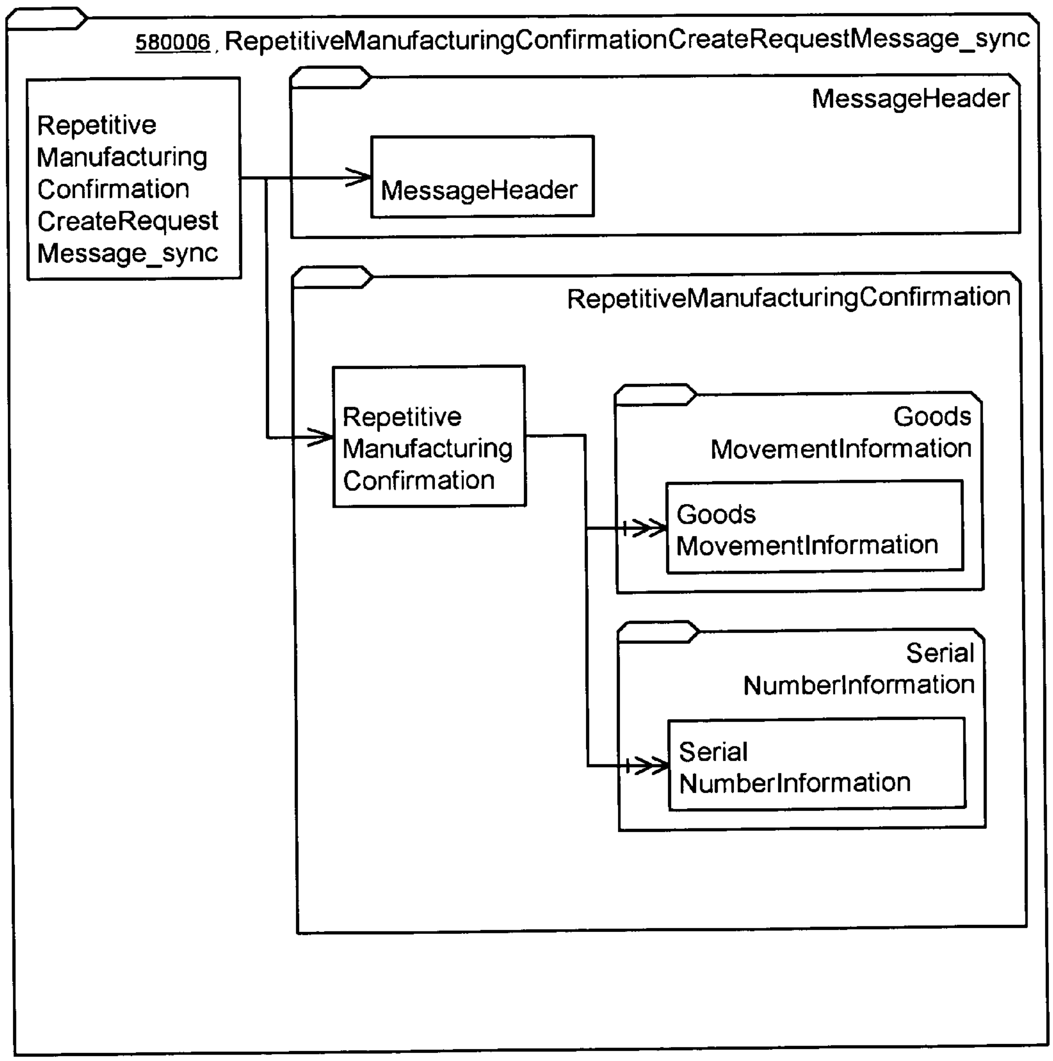
Figure 594:
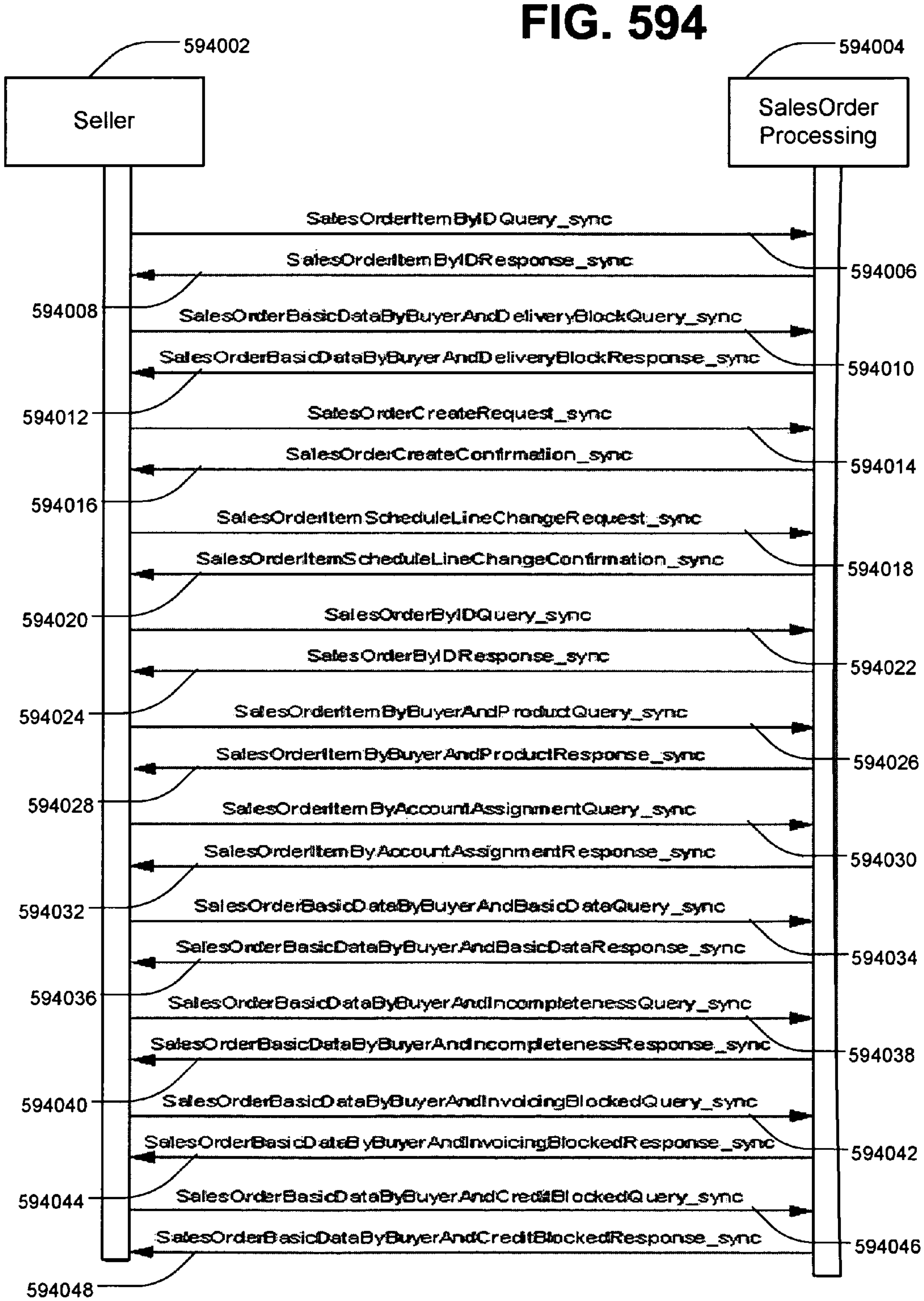
Figure 595:
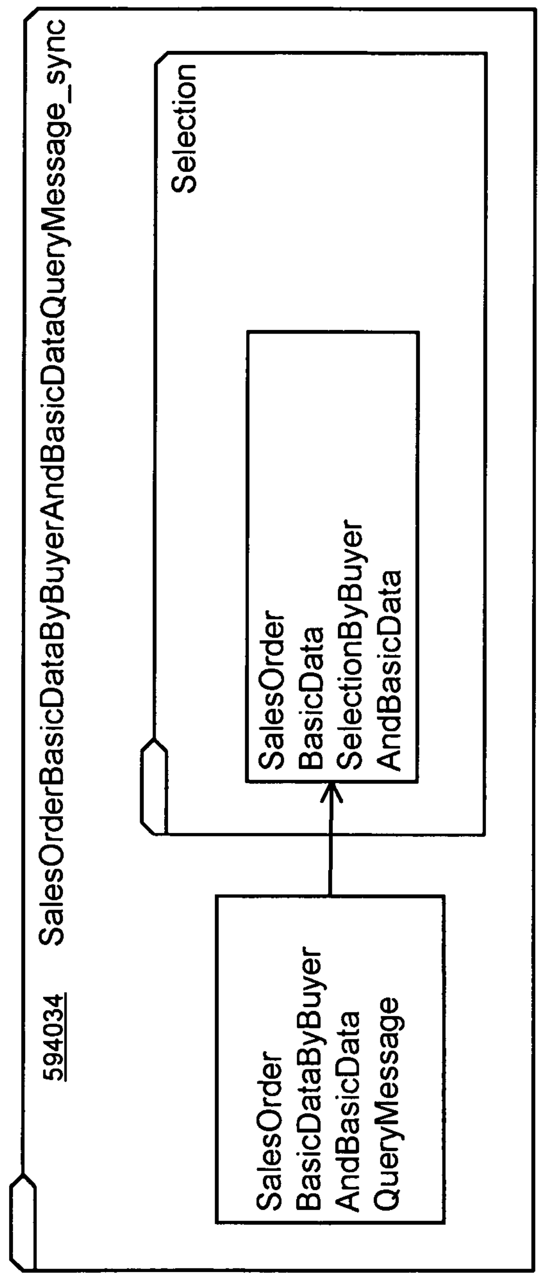
Figure 596:
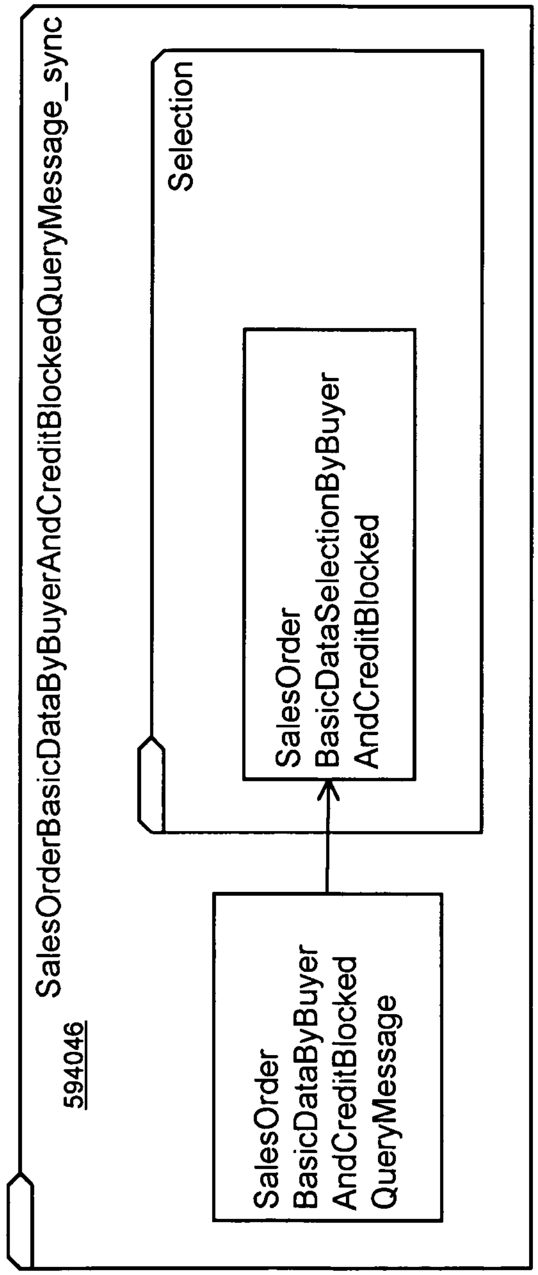
Figure 597:
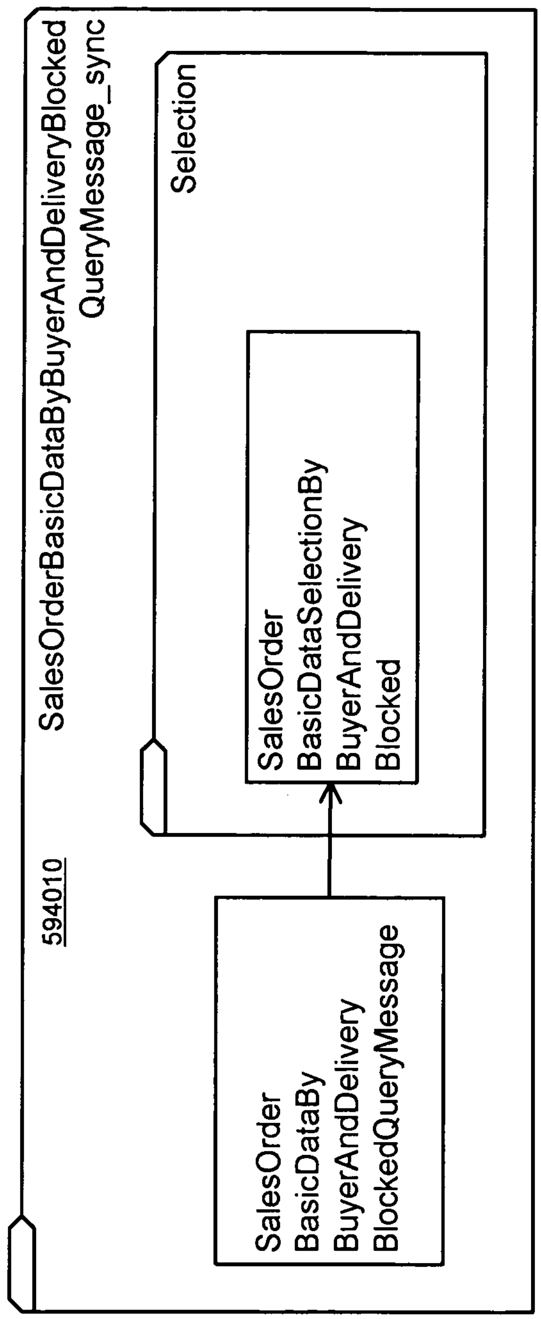
Figure 598:
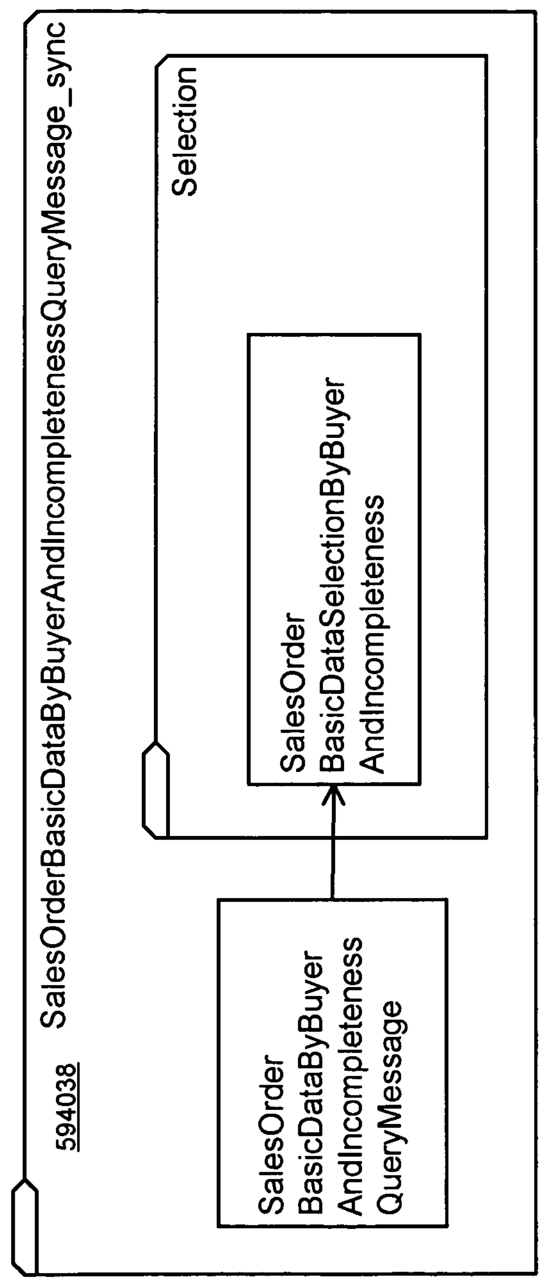
Figure 599:
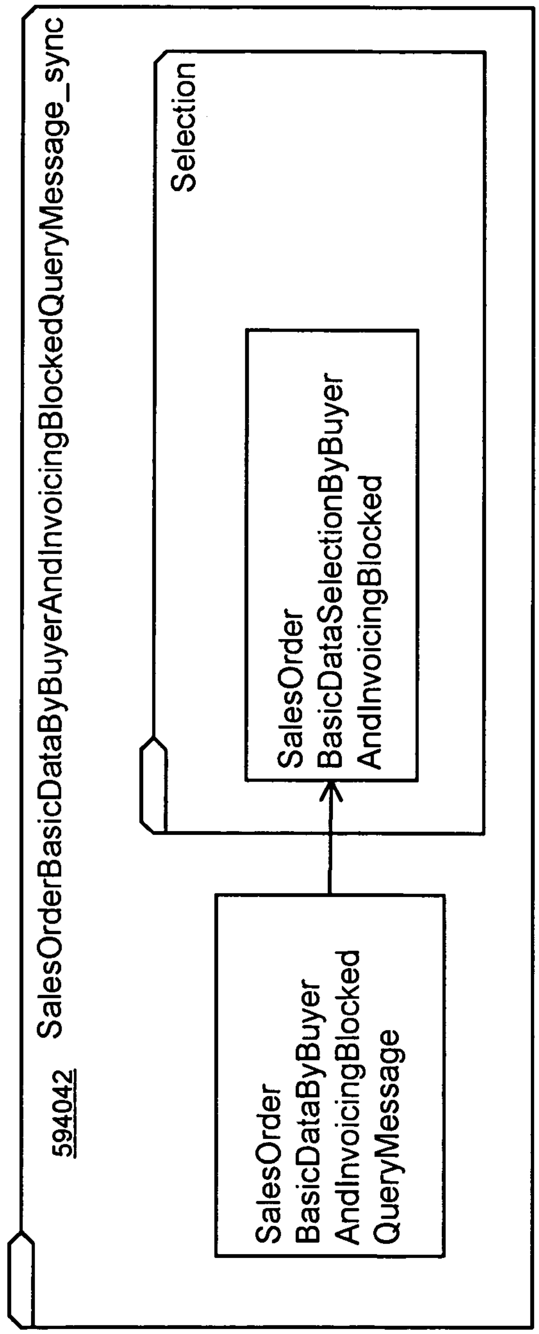
Figure 600:
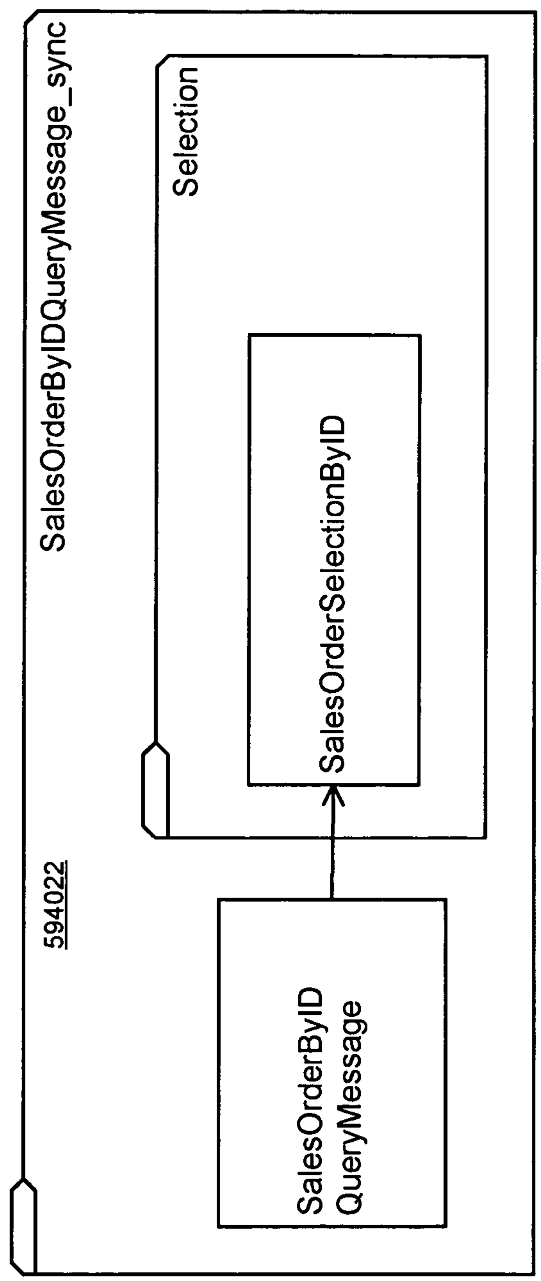
Figure 601:
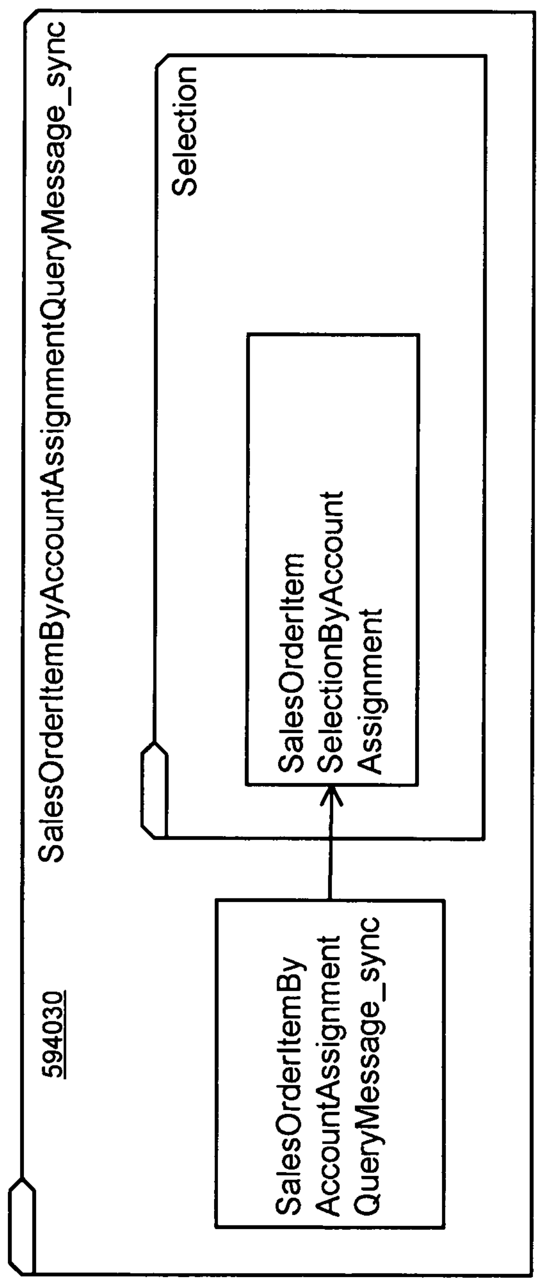
Figure 602:
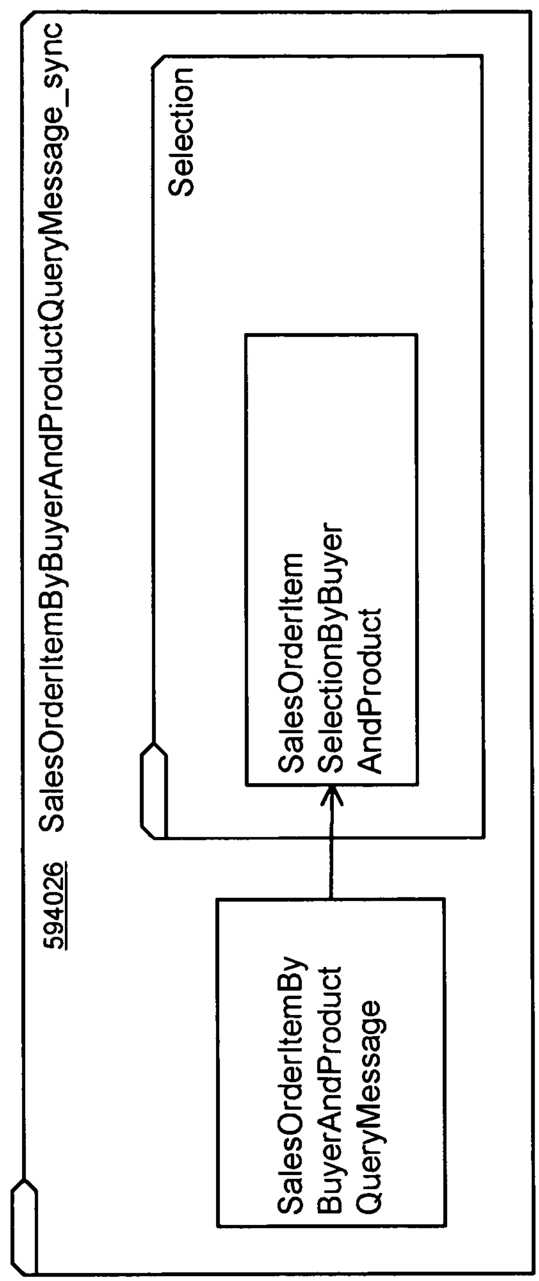
Figure 603:
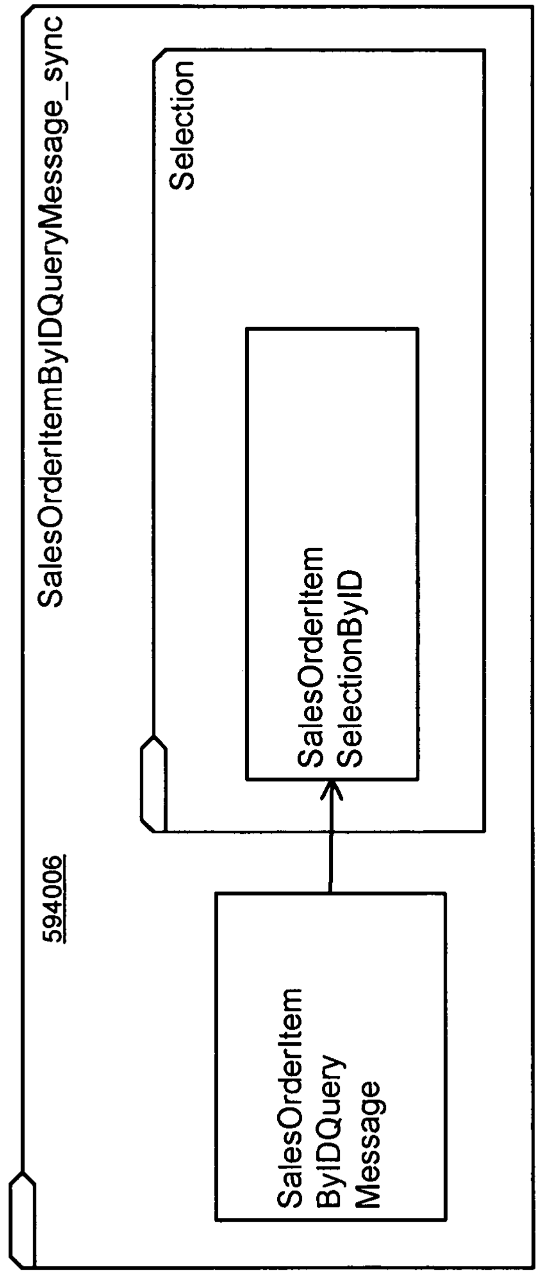
Figure 627:
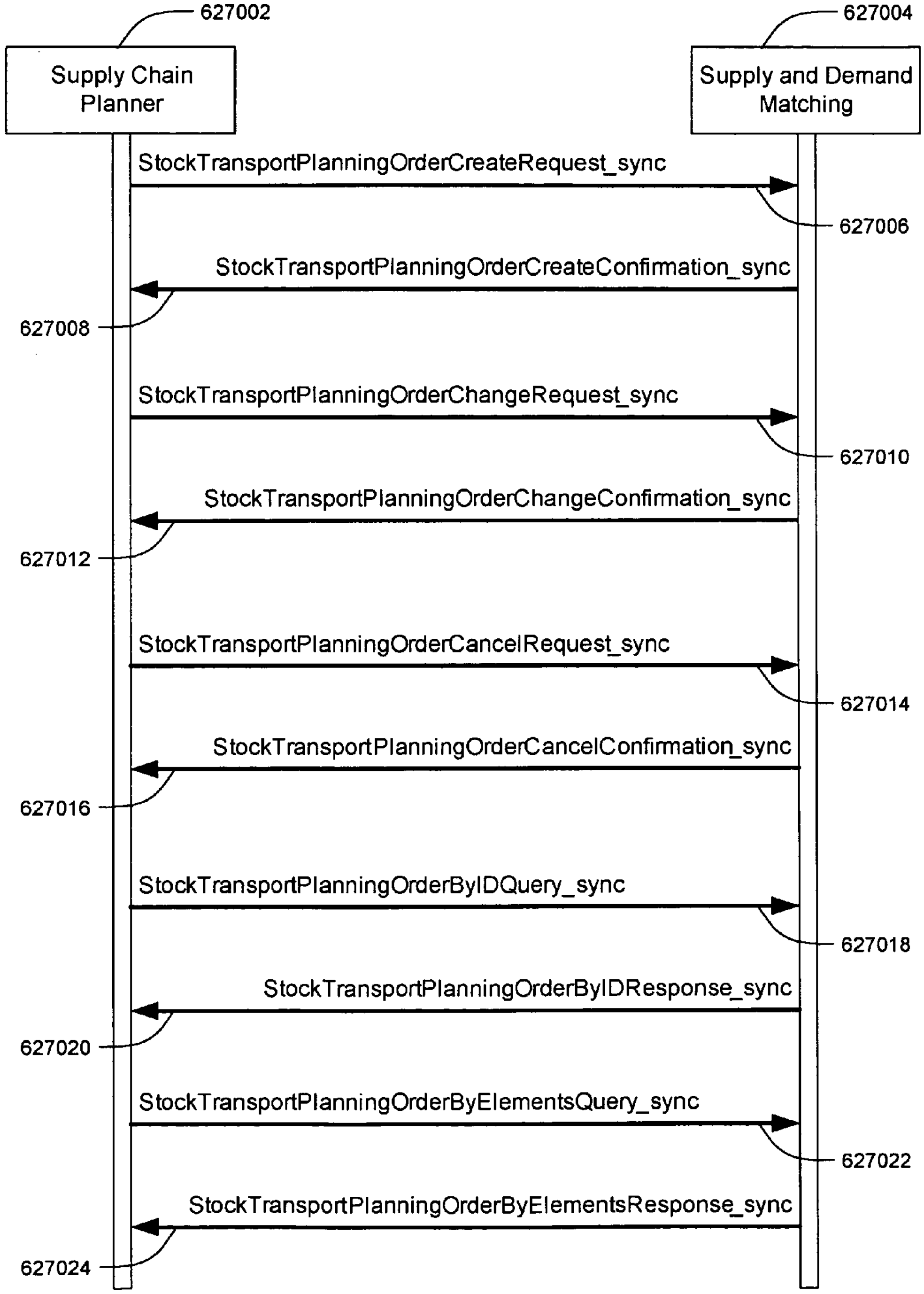
Figure 628:
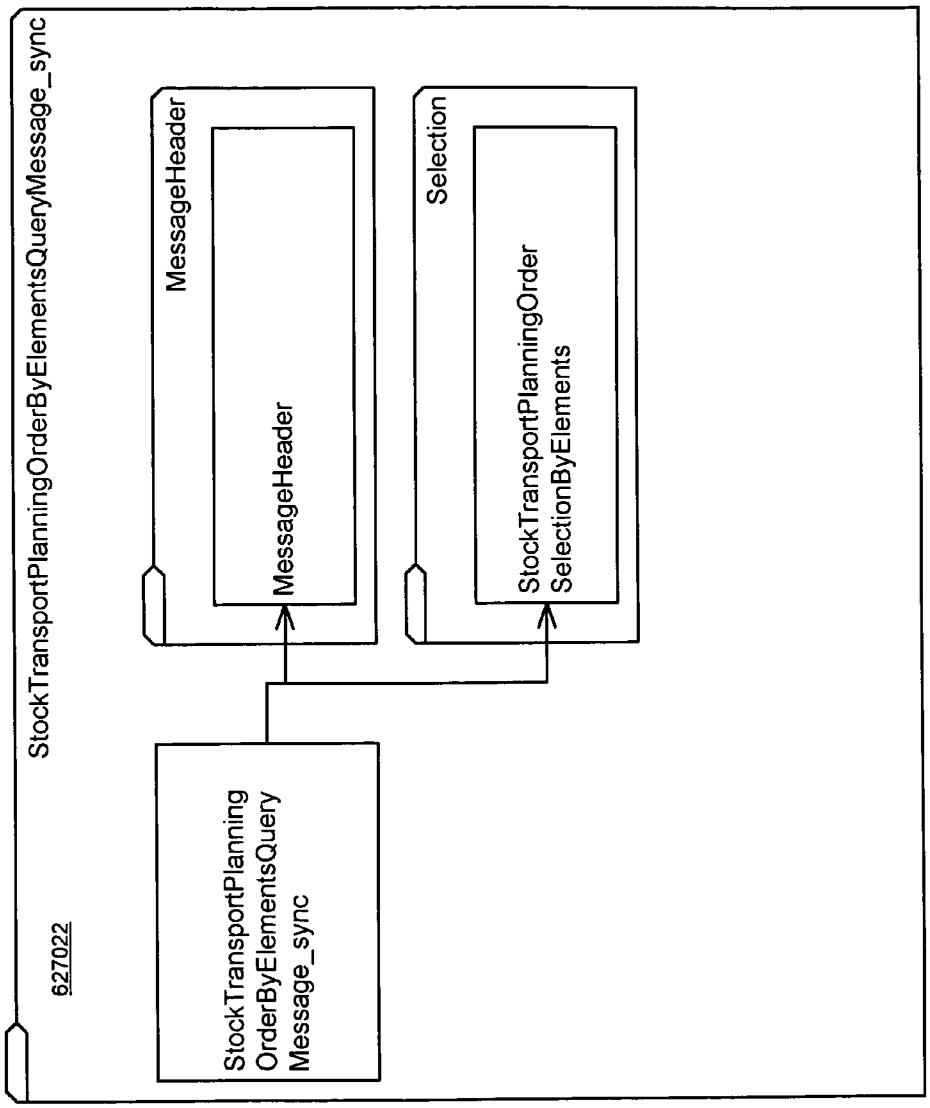
Figure 629:
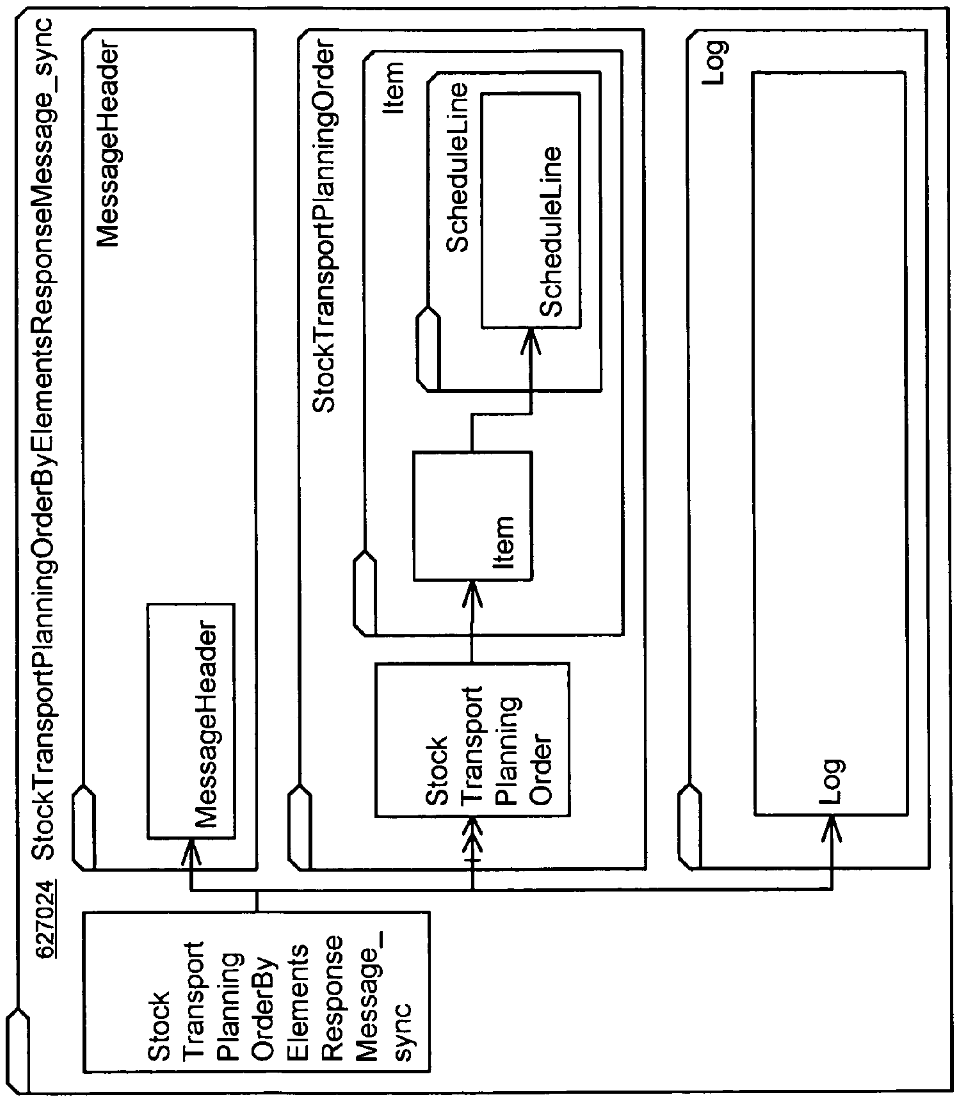
Figure 630:
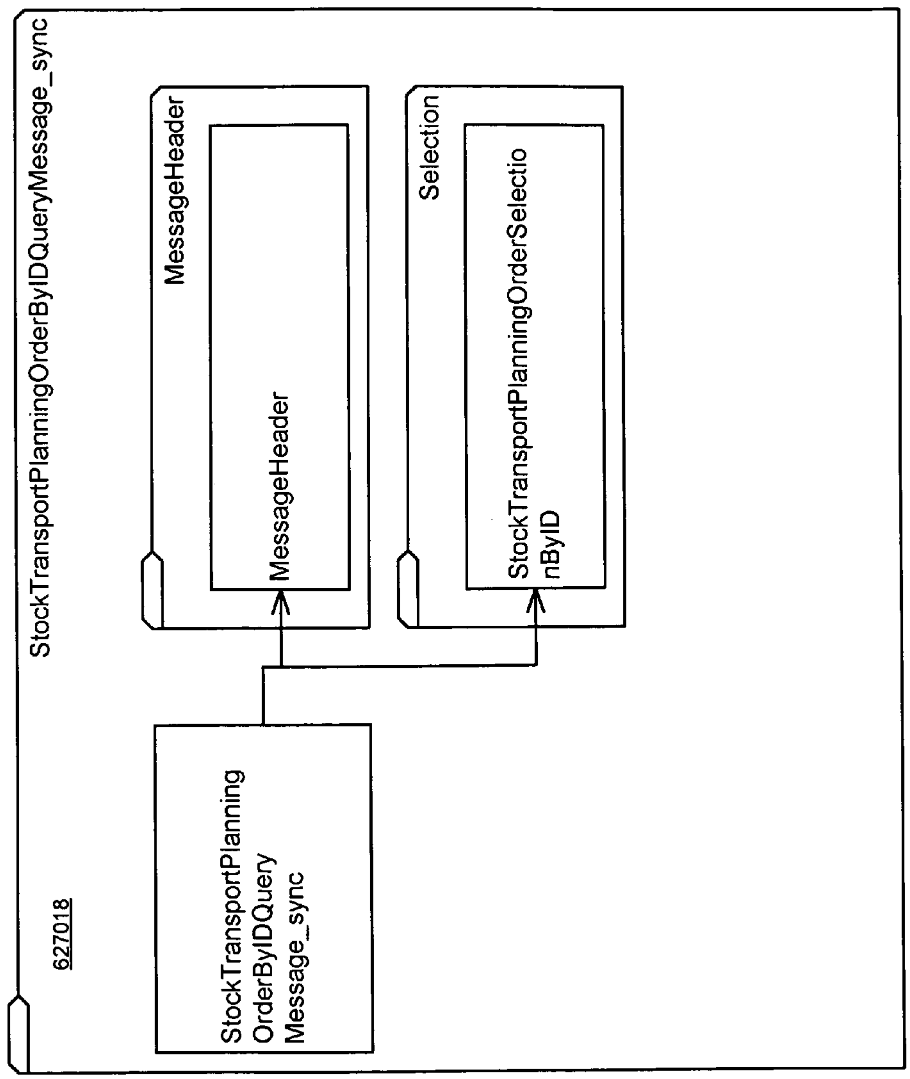
Figure 631:
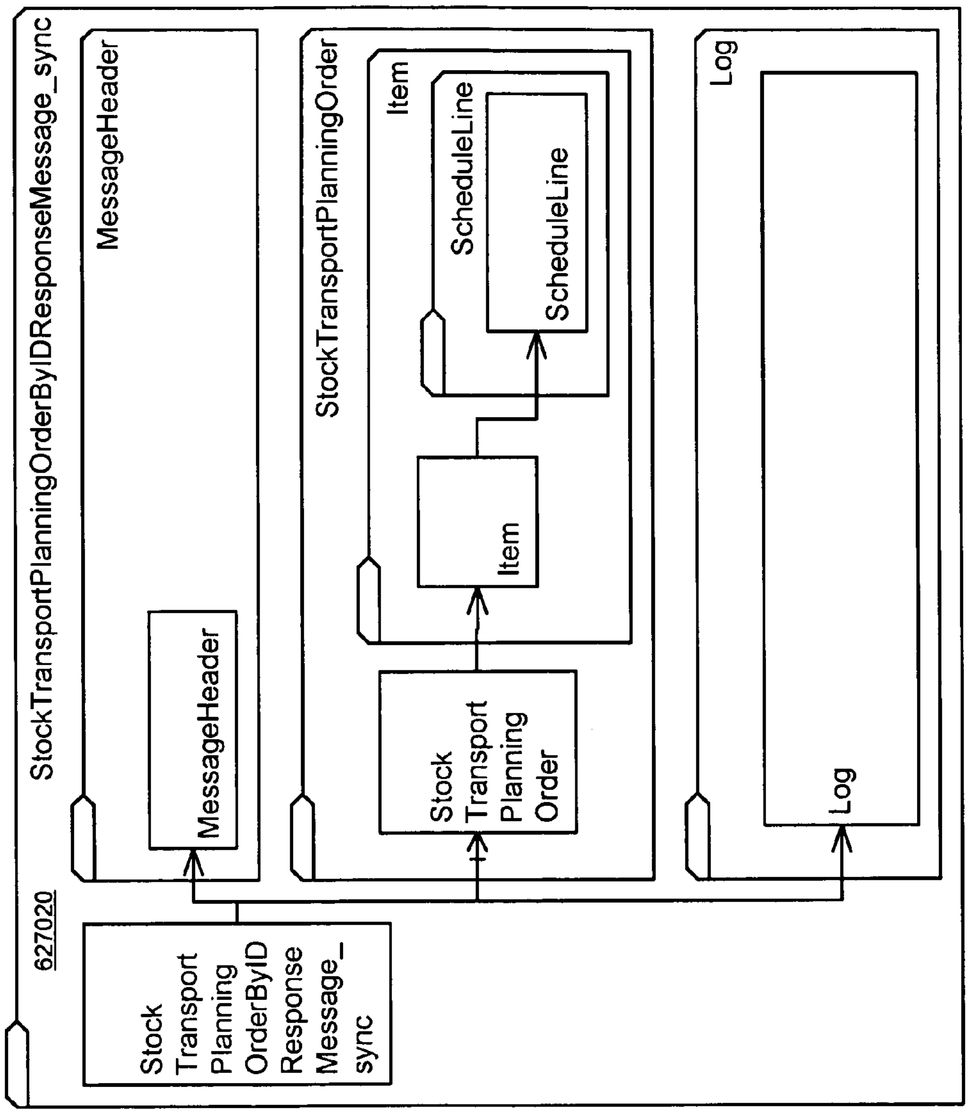
Figure 632:
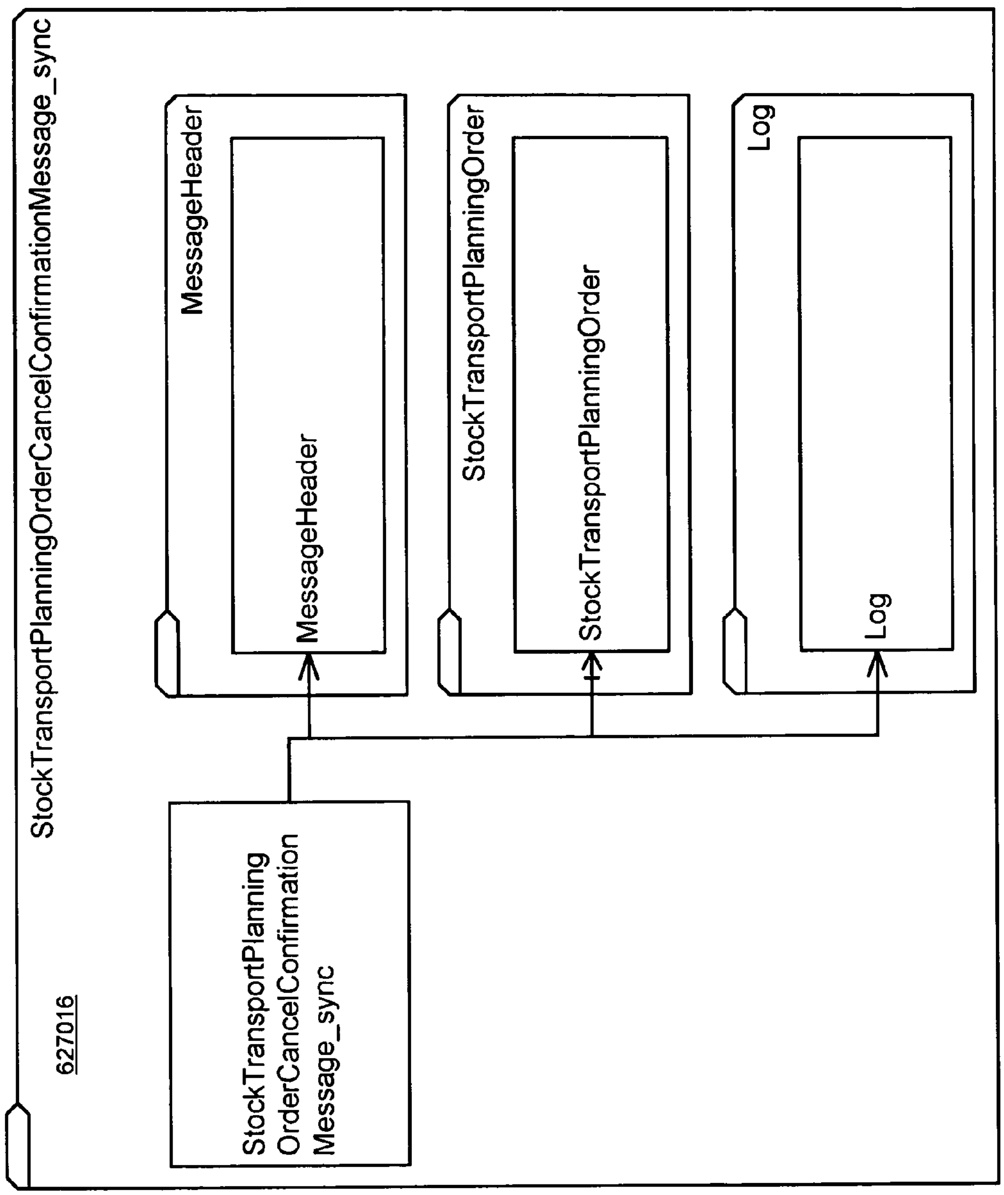
Figure 633:
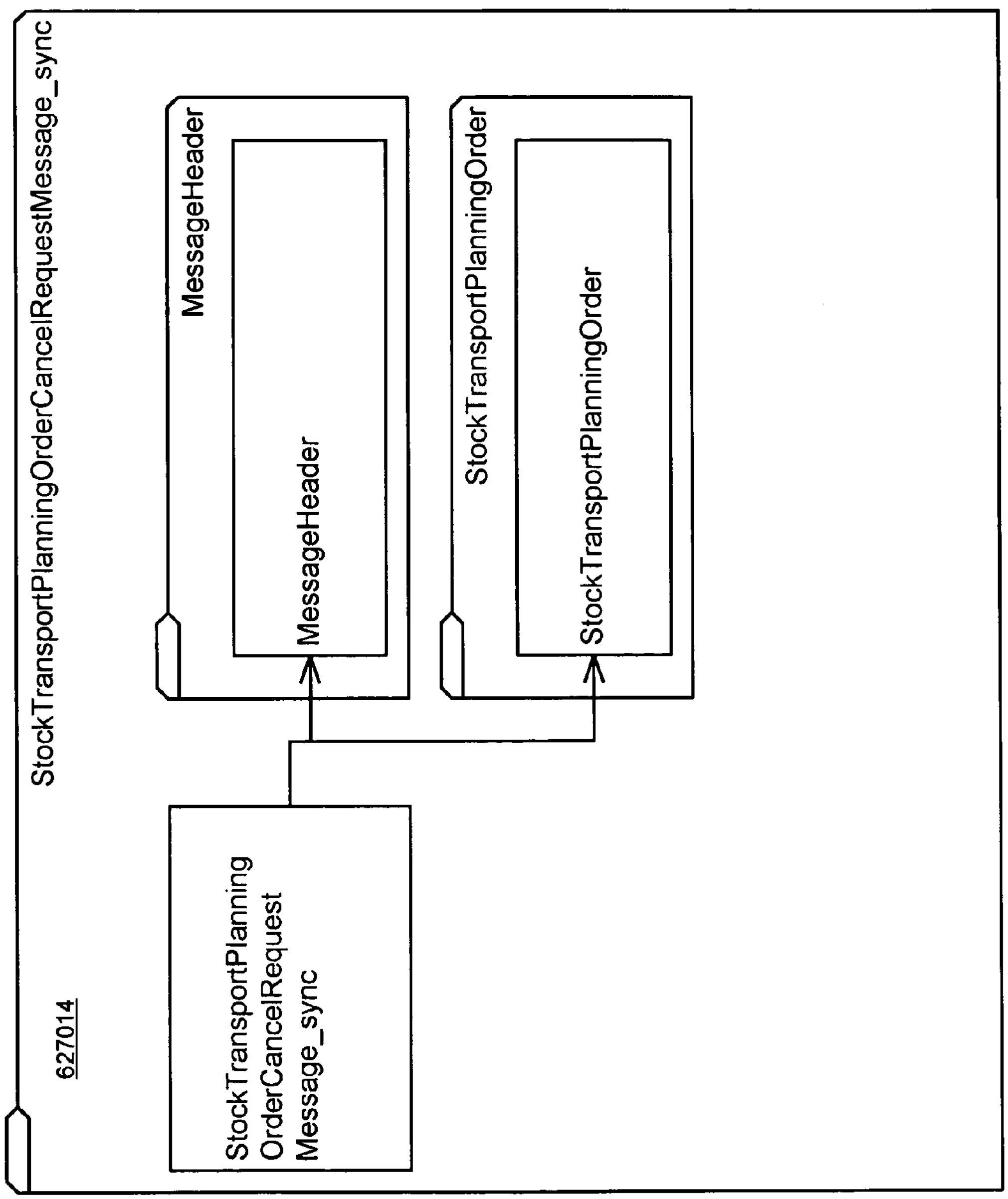
Figure 634:
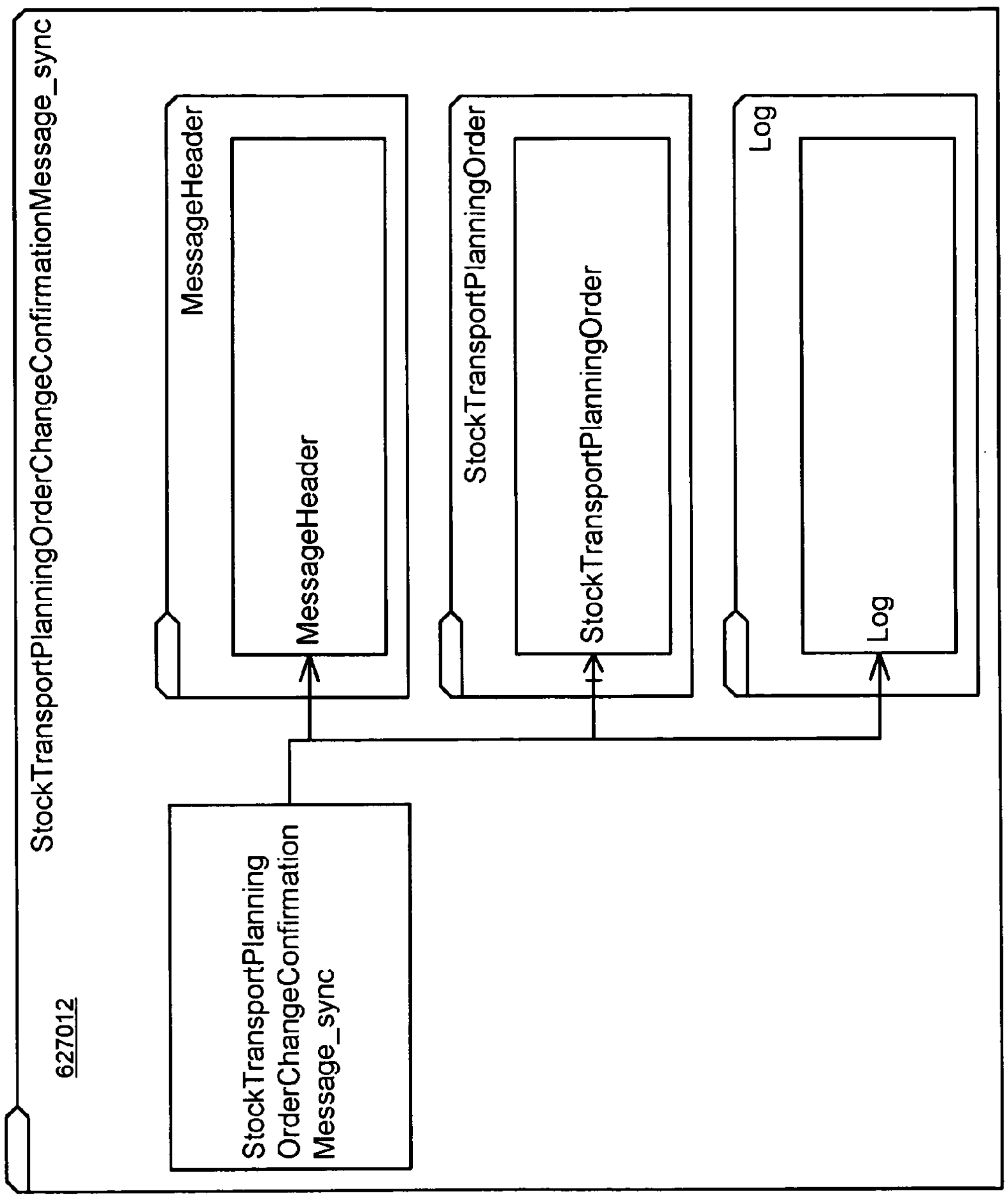
Figure 635:
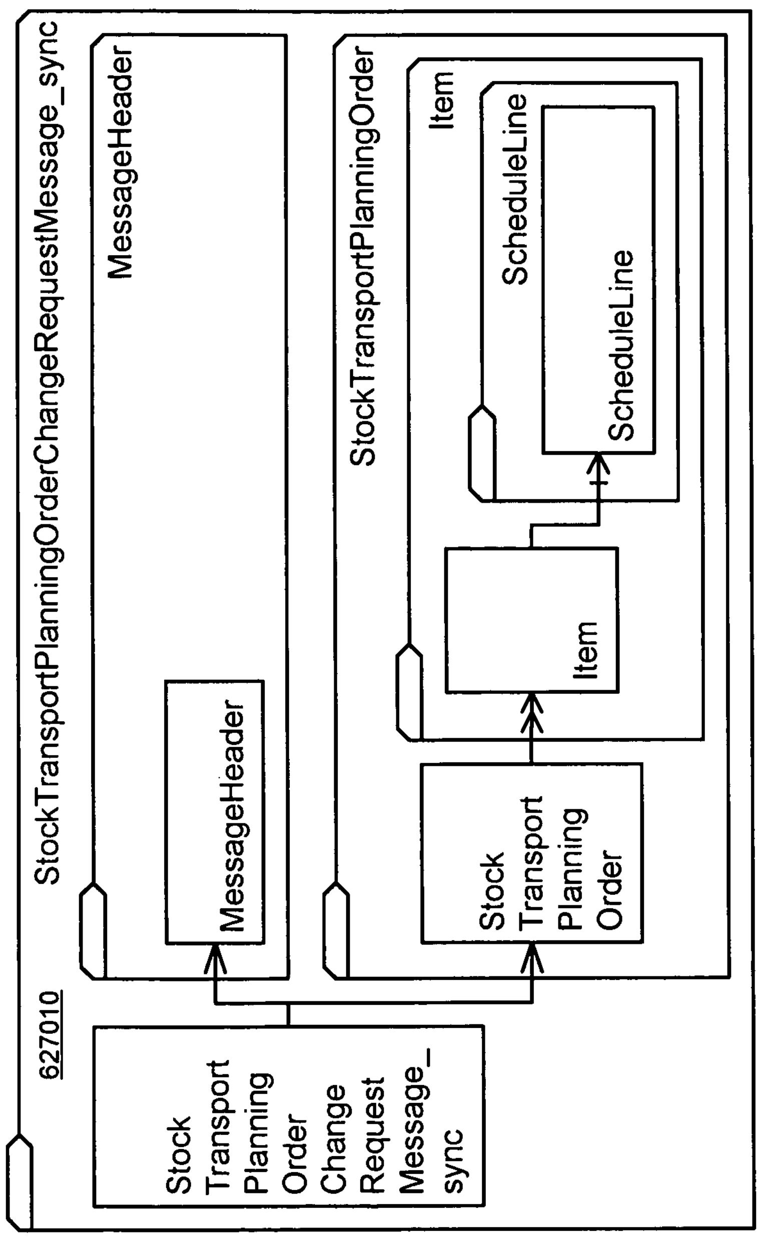
Figure 636:
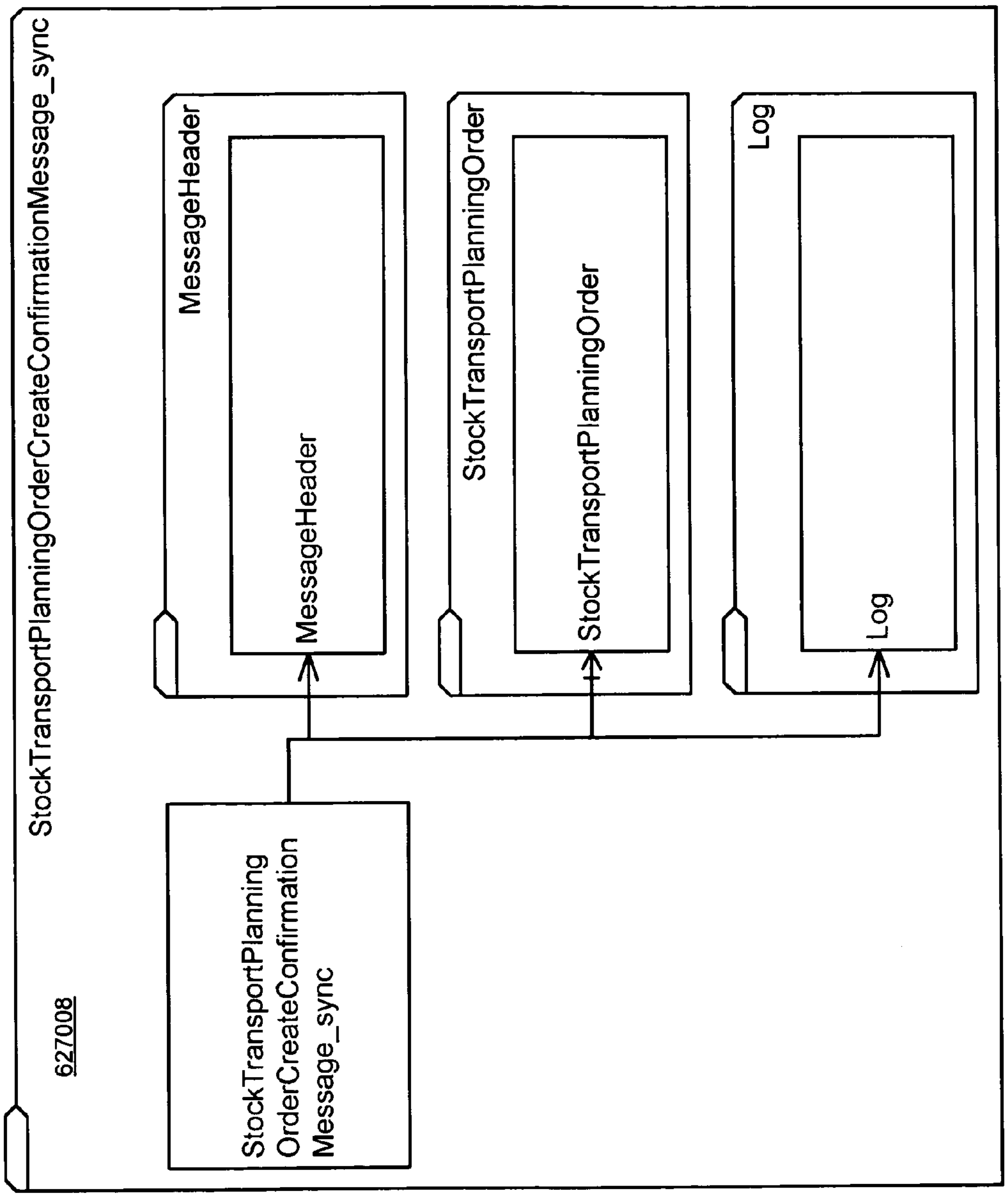
Figure 637:
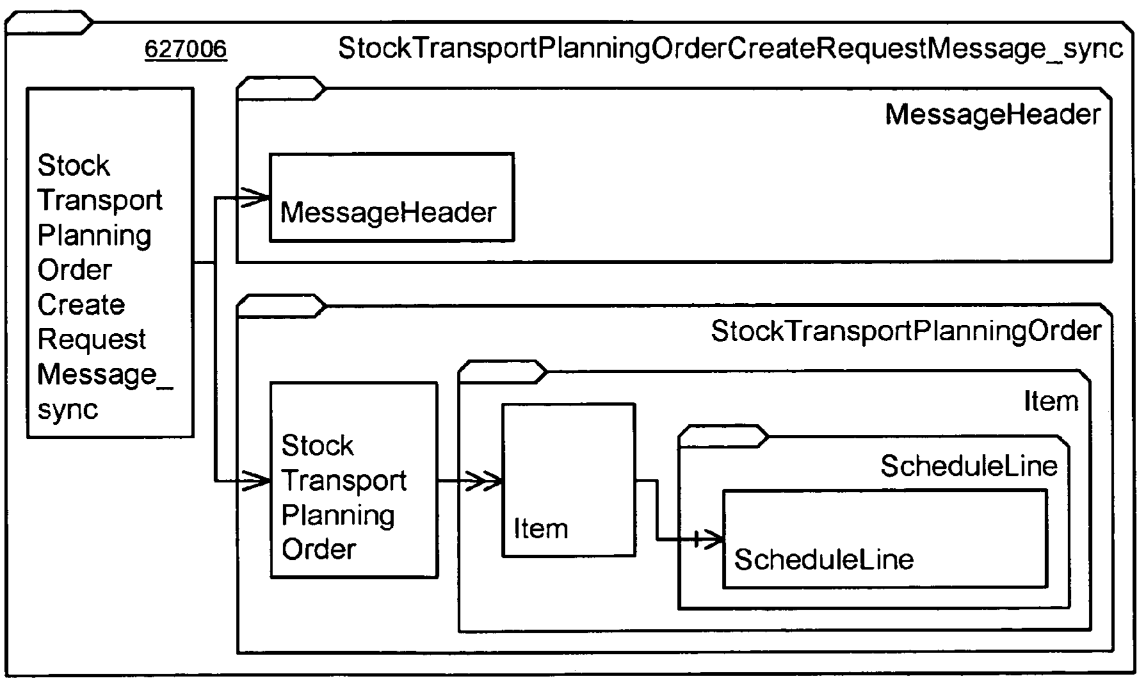
Figure 648:
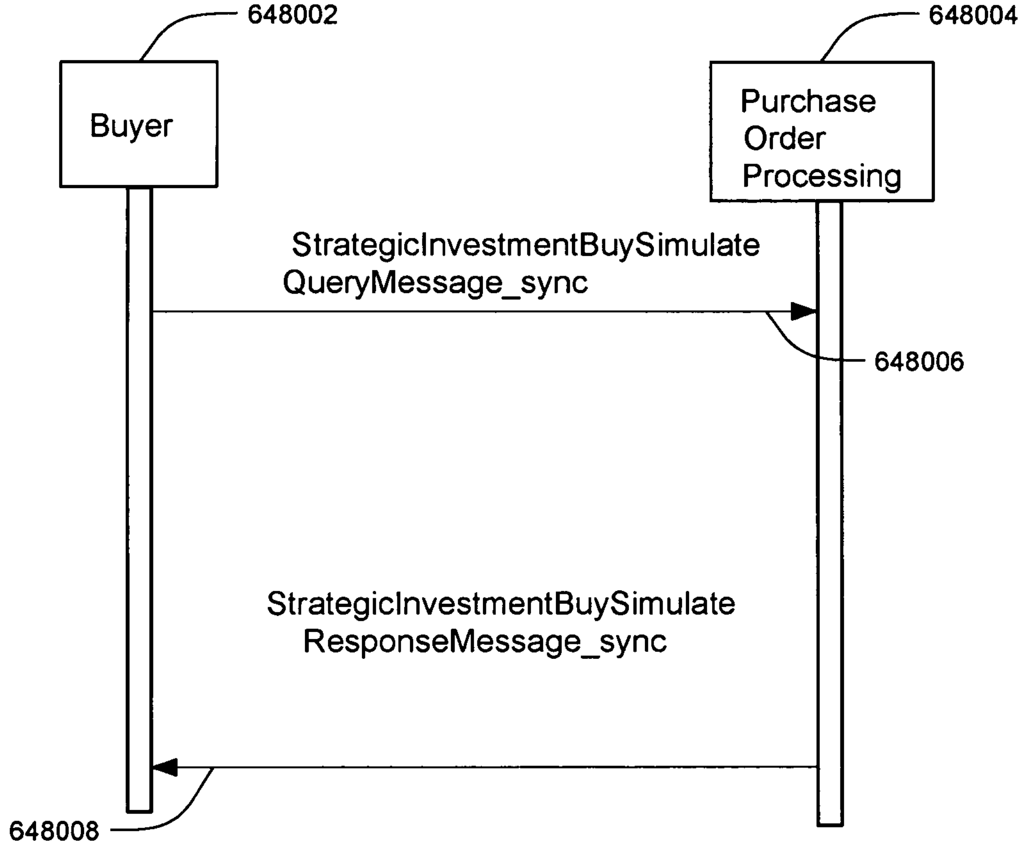
Figure 649:
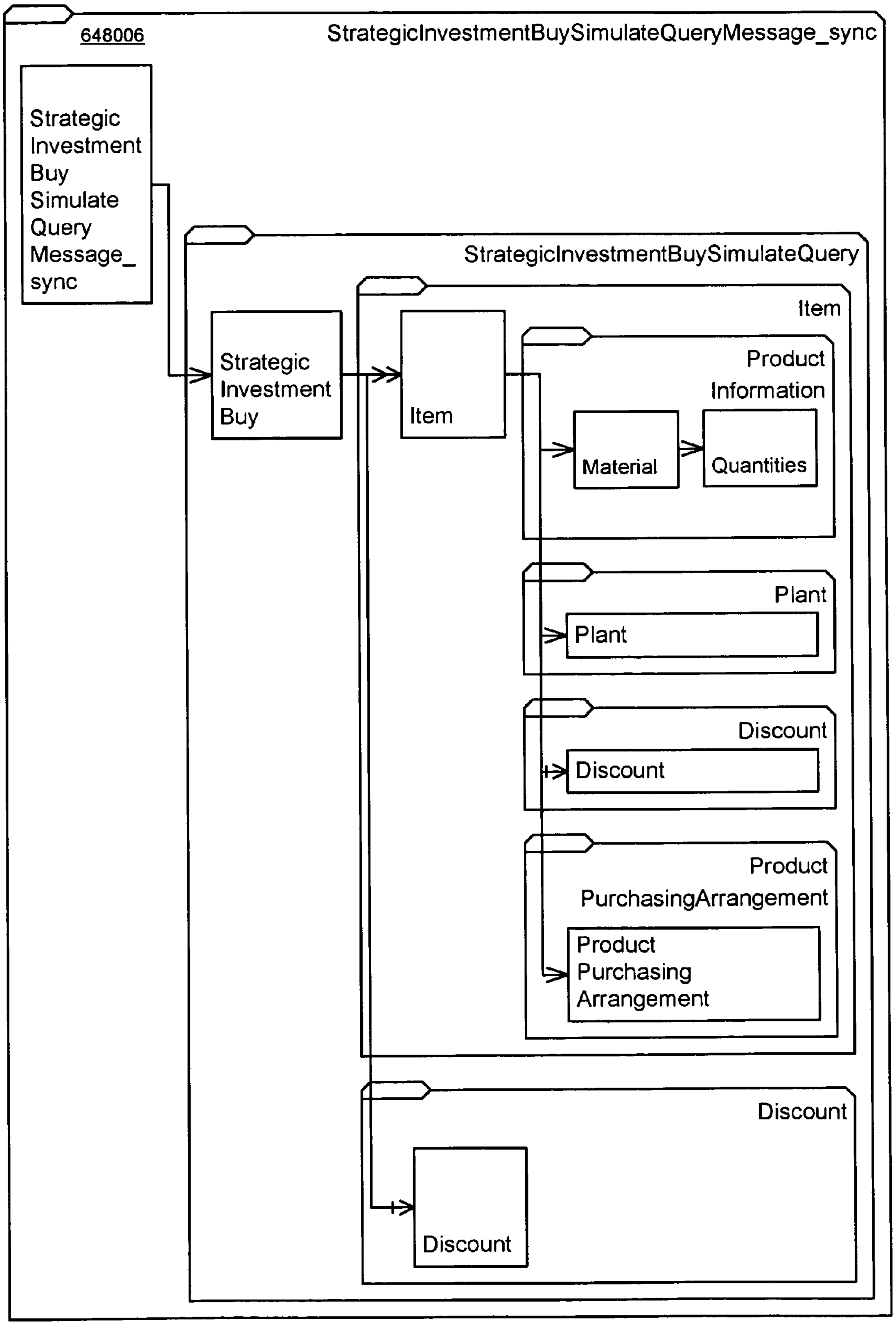
Figure 650:
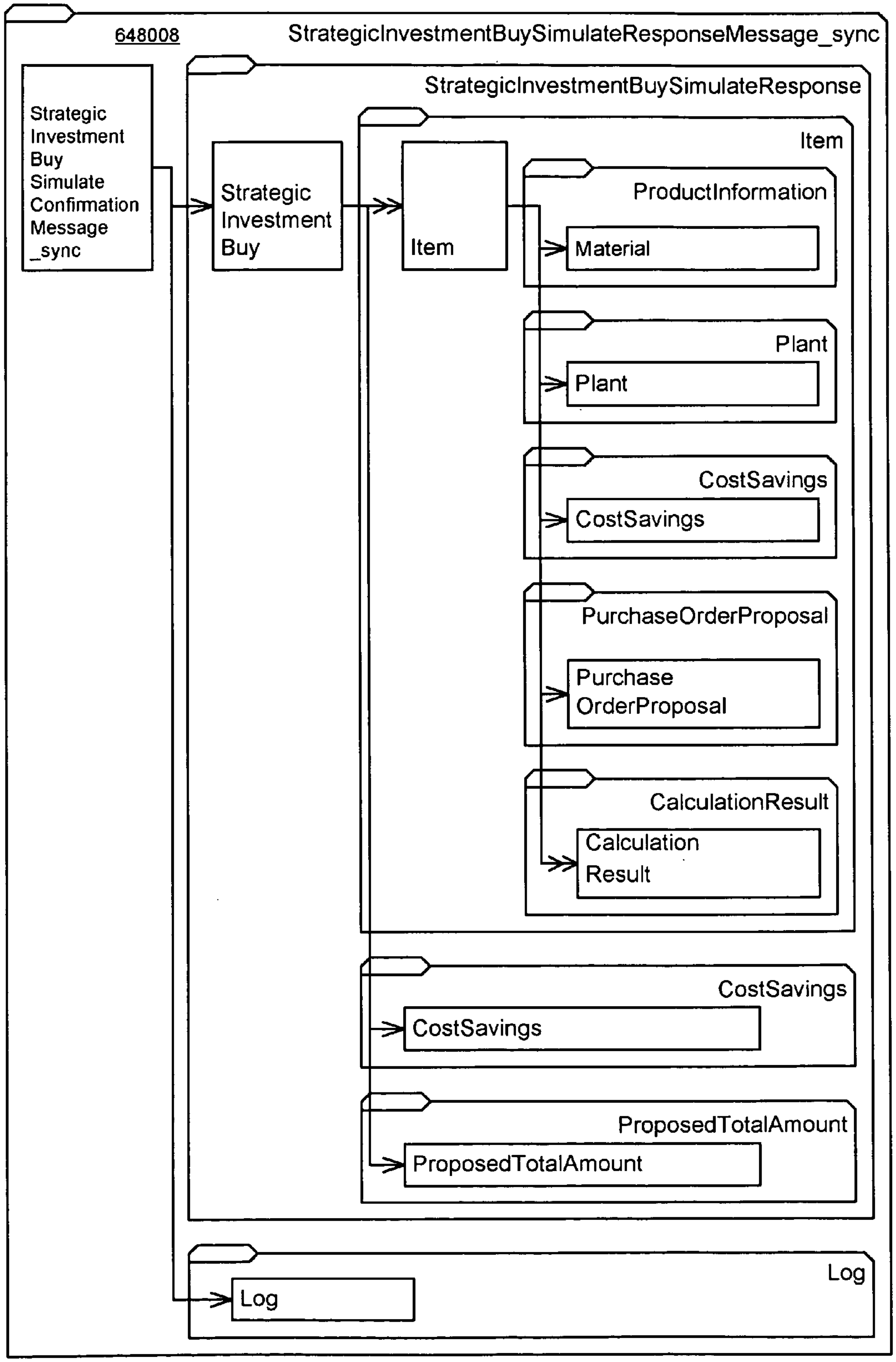
Figures 1, 653:
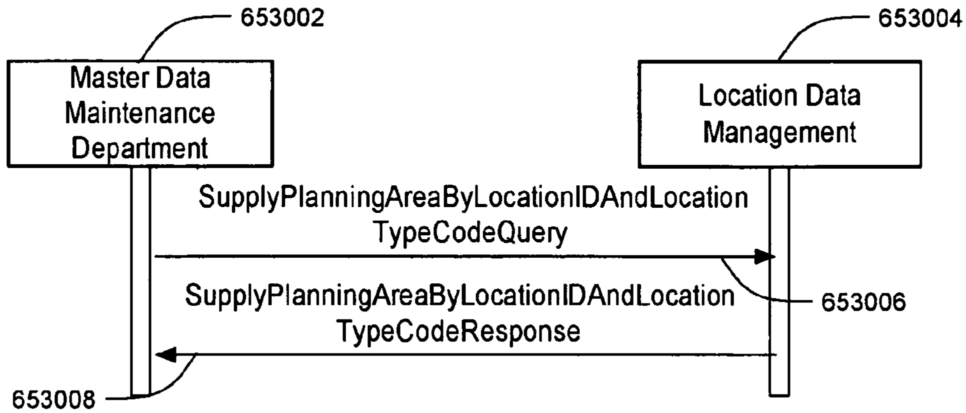
Figures 2, 653:
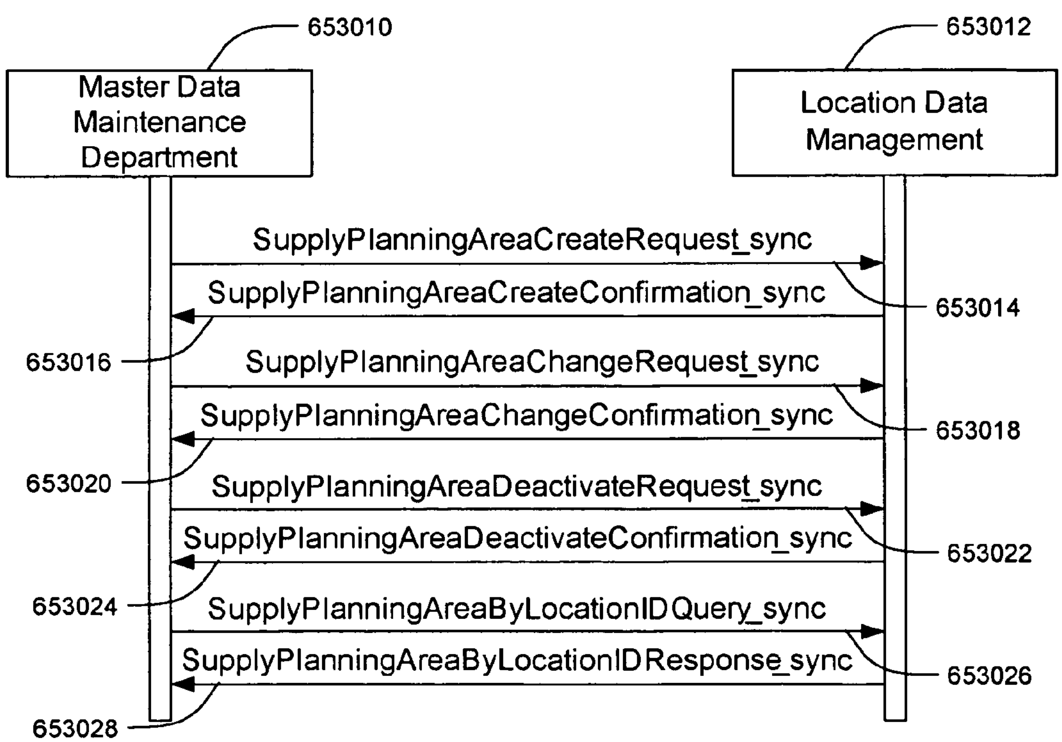
Figure 654:
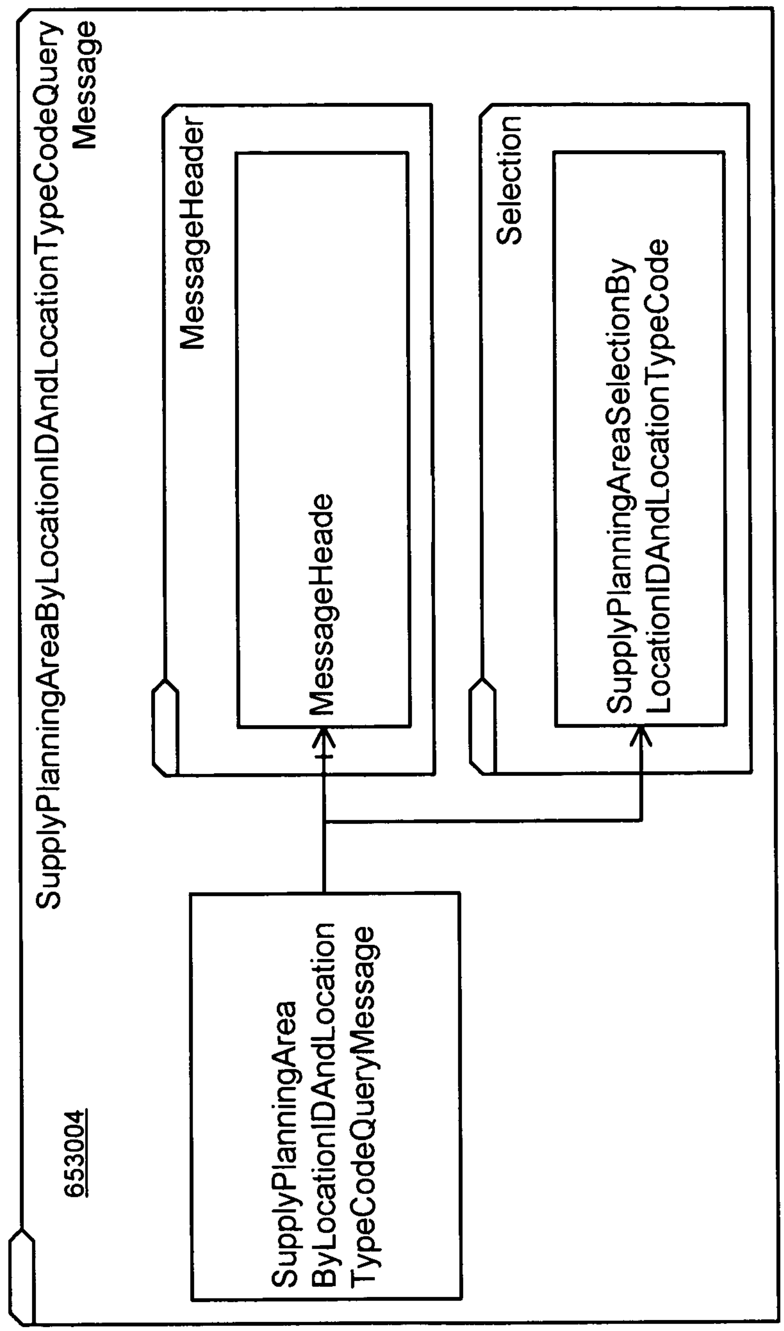
Figure 655:
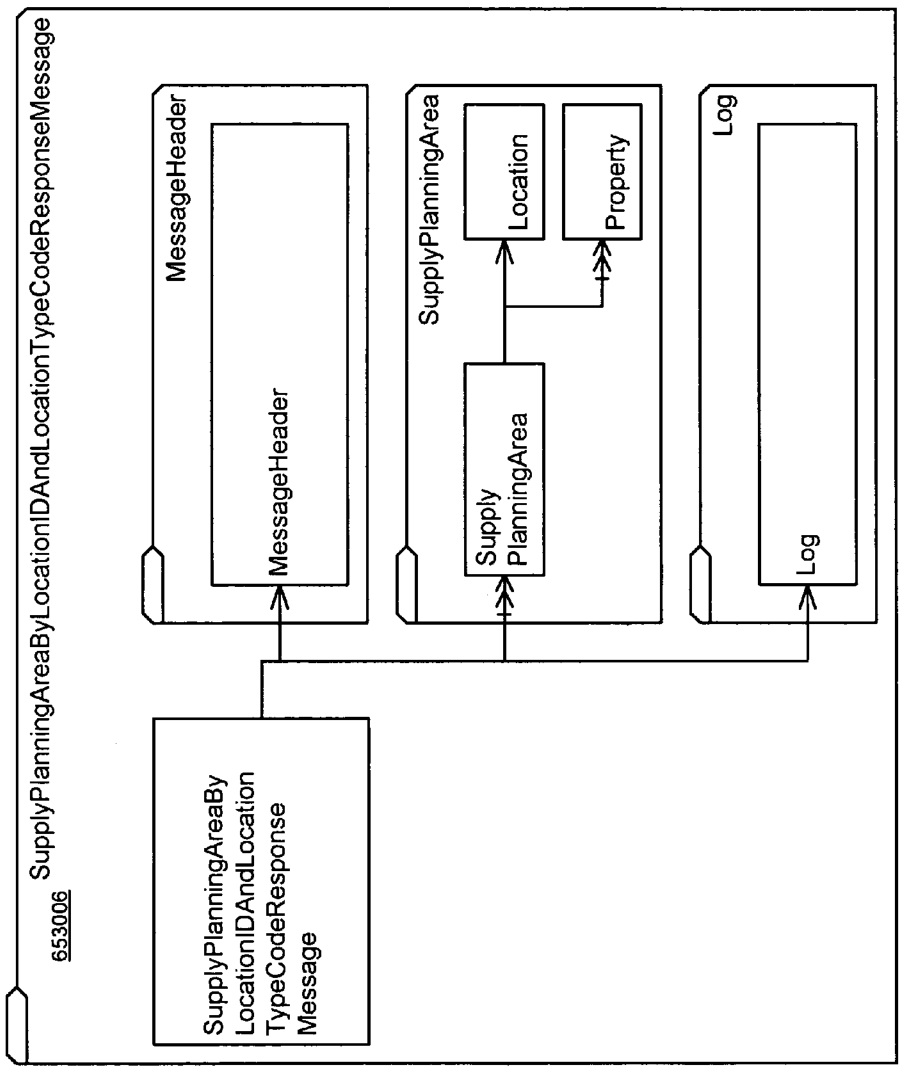
Figure 656:
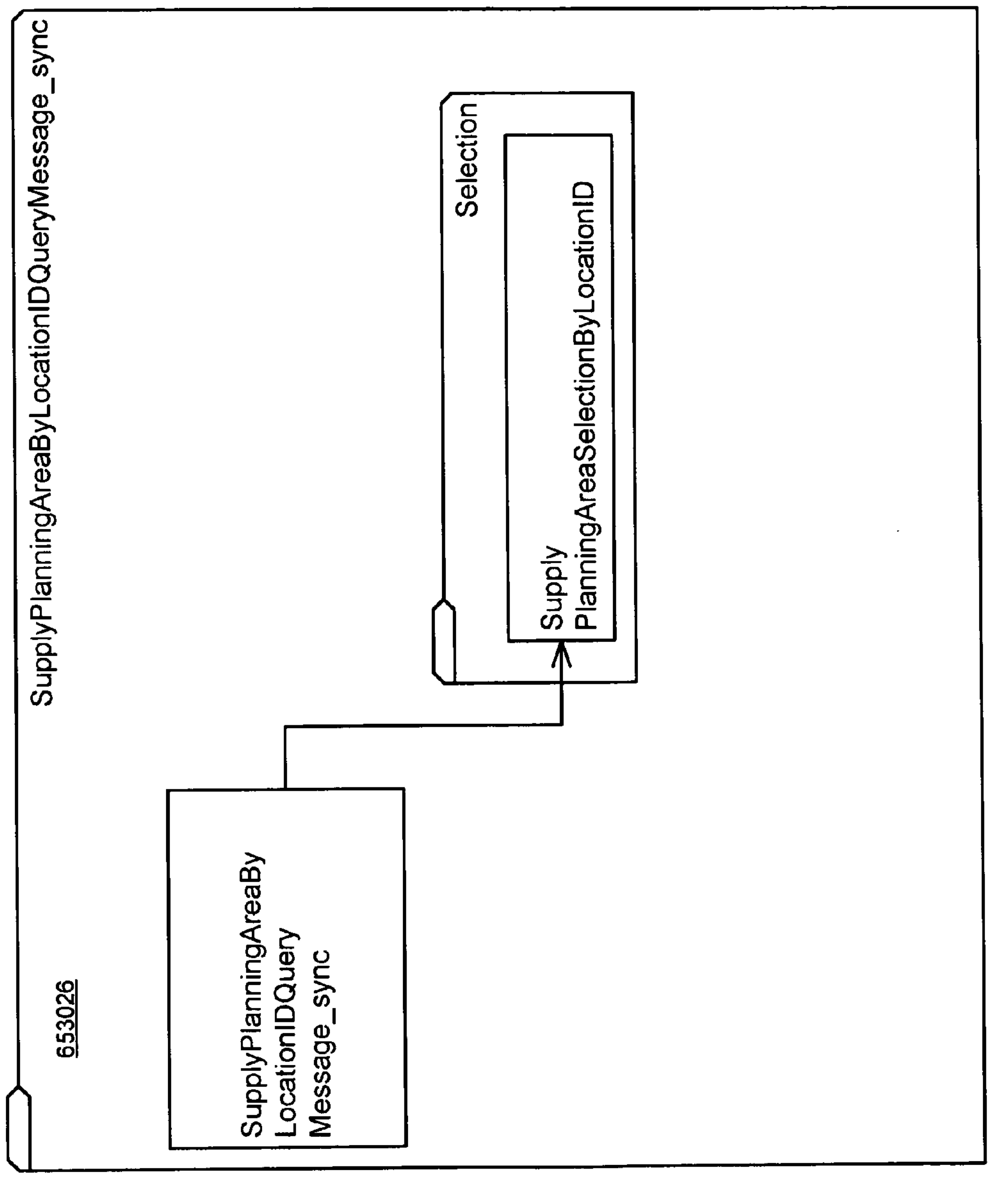
Figure 657:
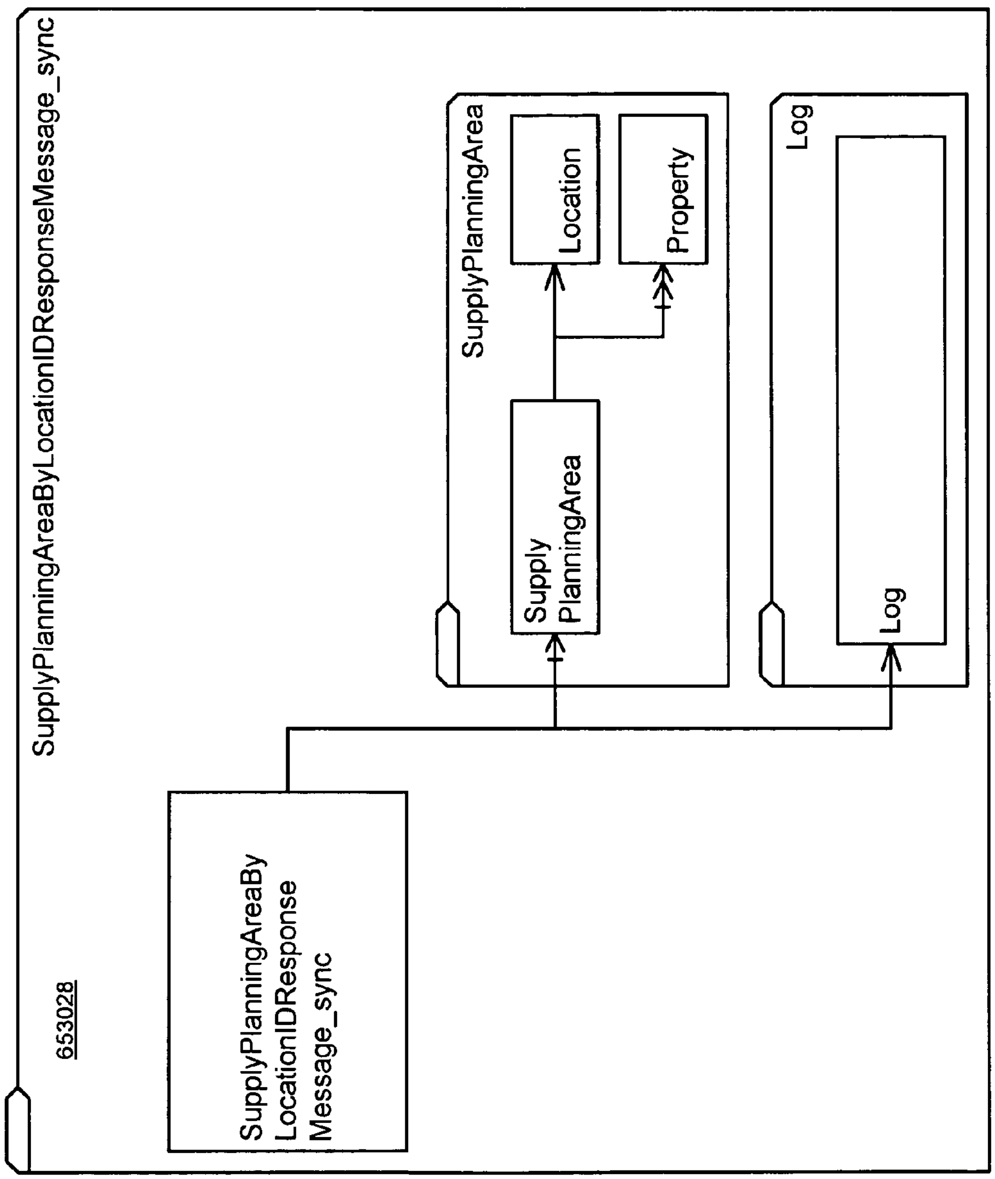
Figure 658:
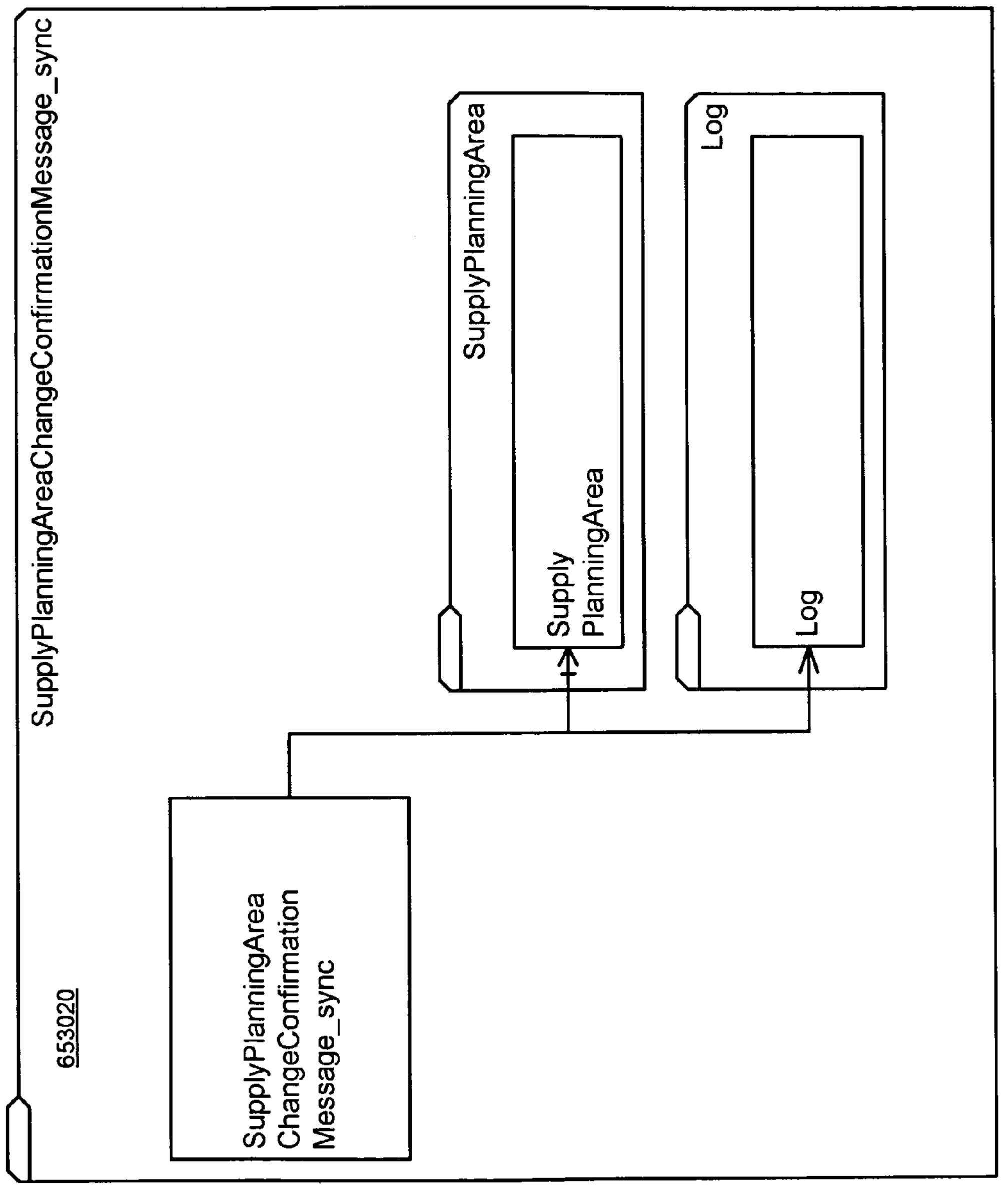
Figure 659:
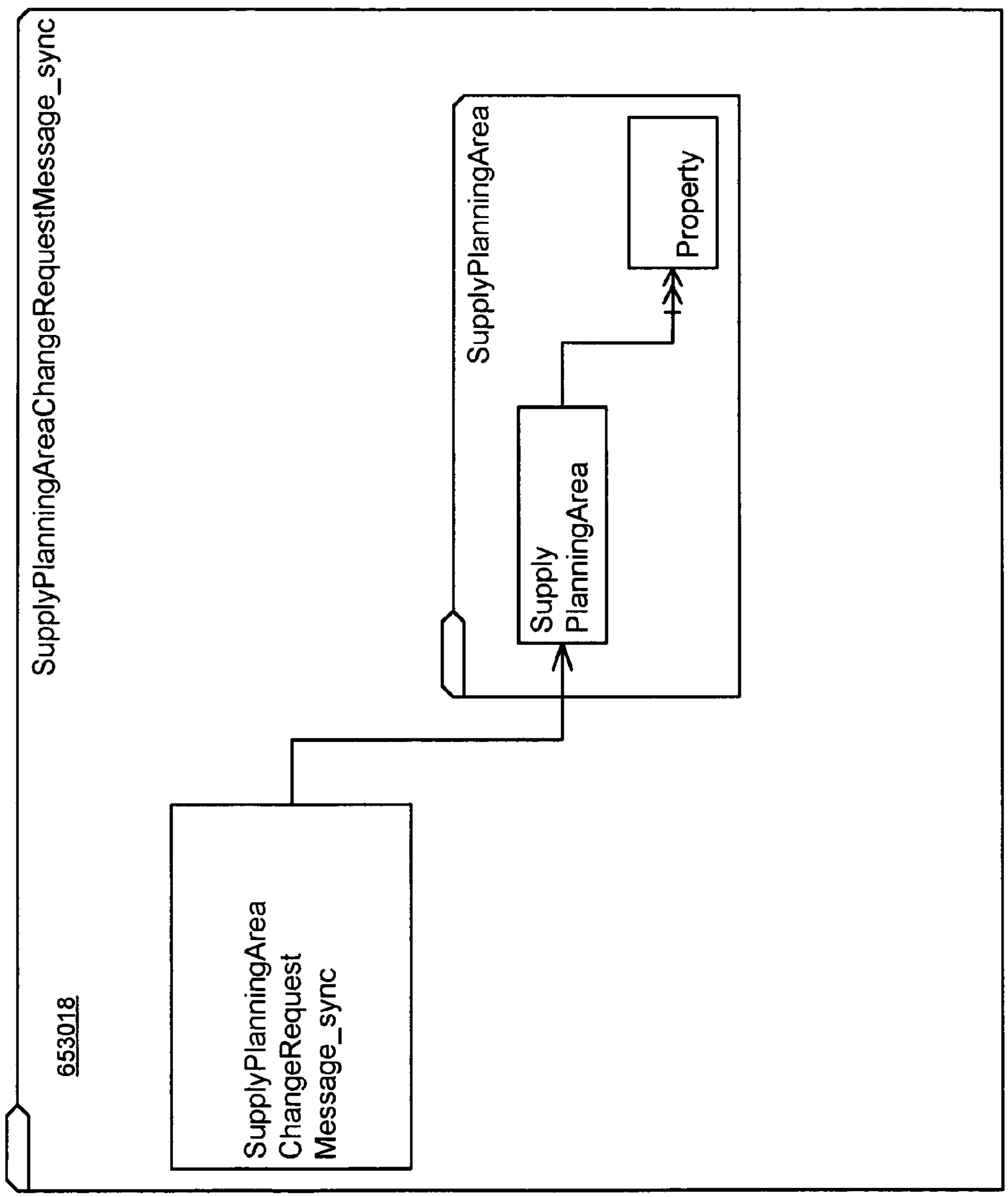
Figure 660:
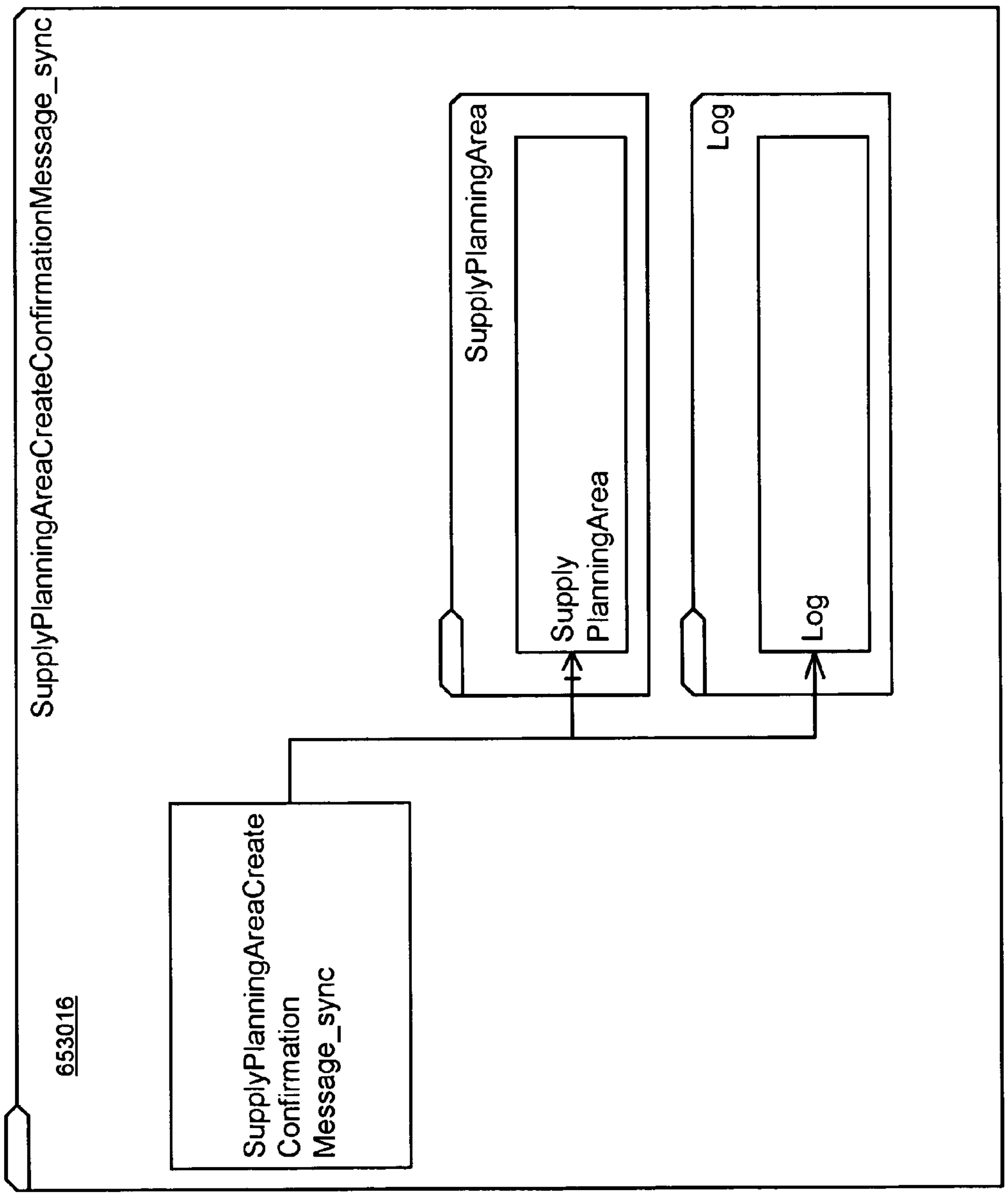
Figure 661:
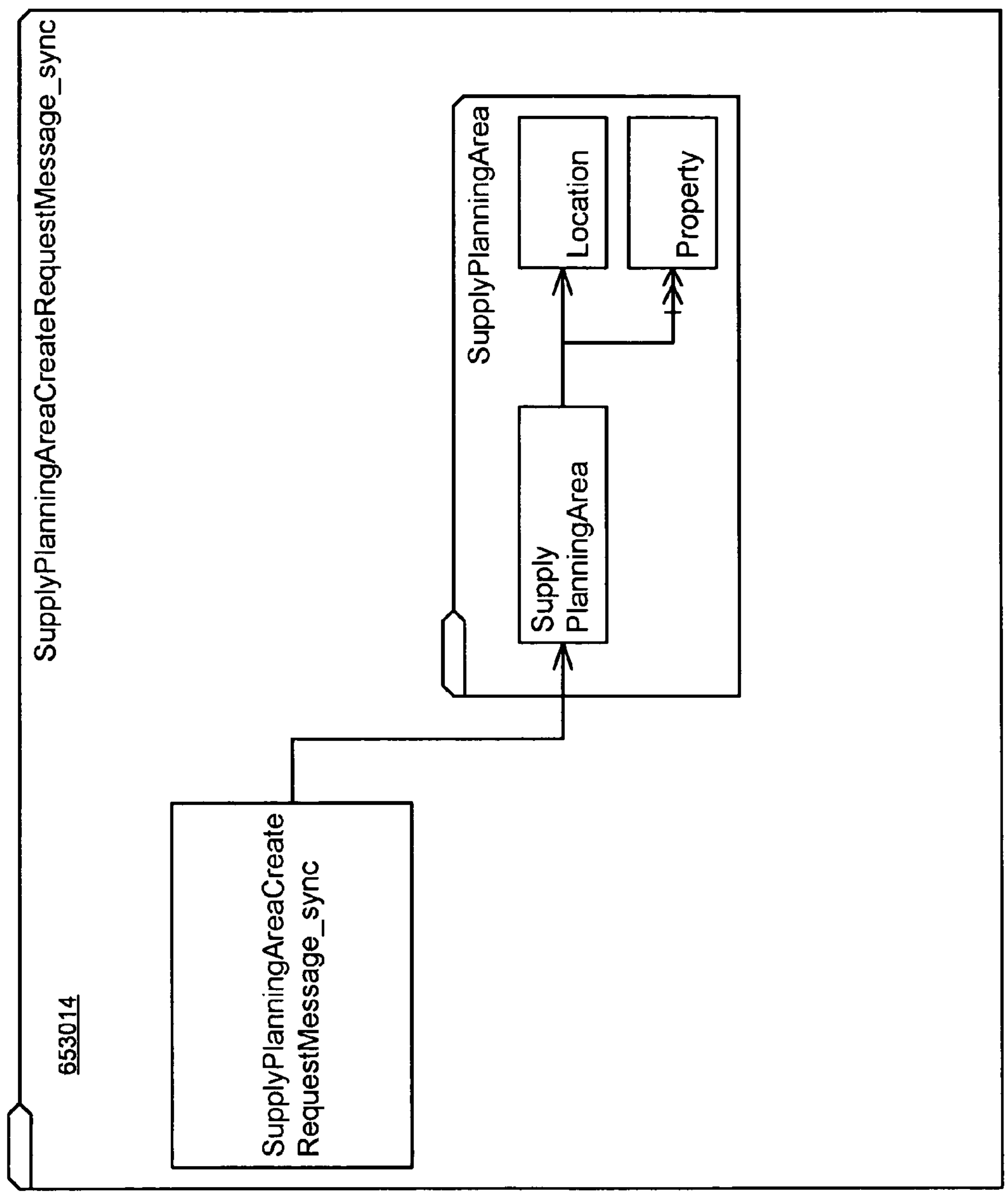
Figure 662:
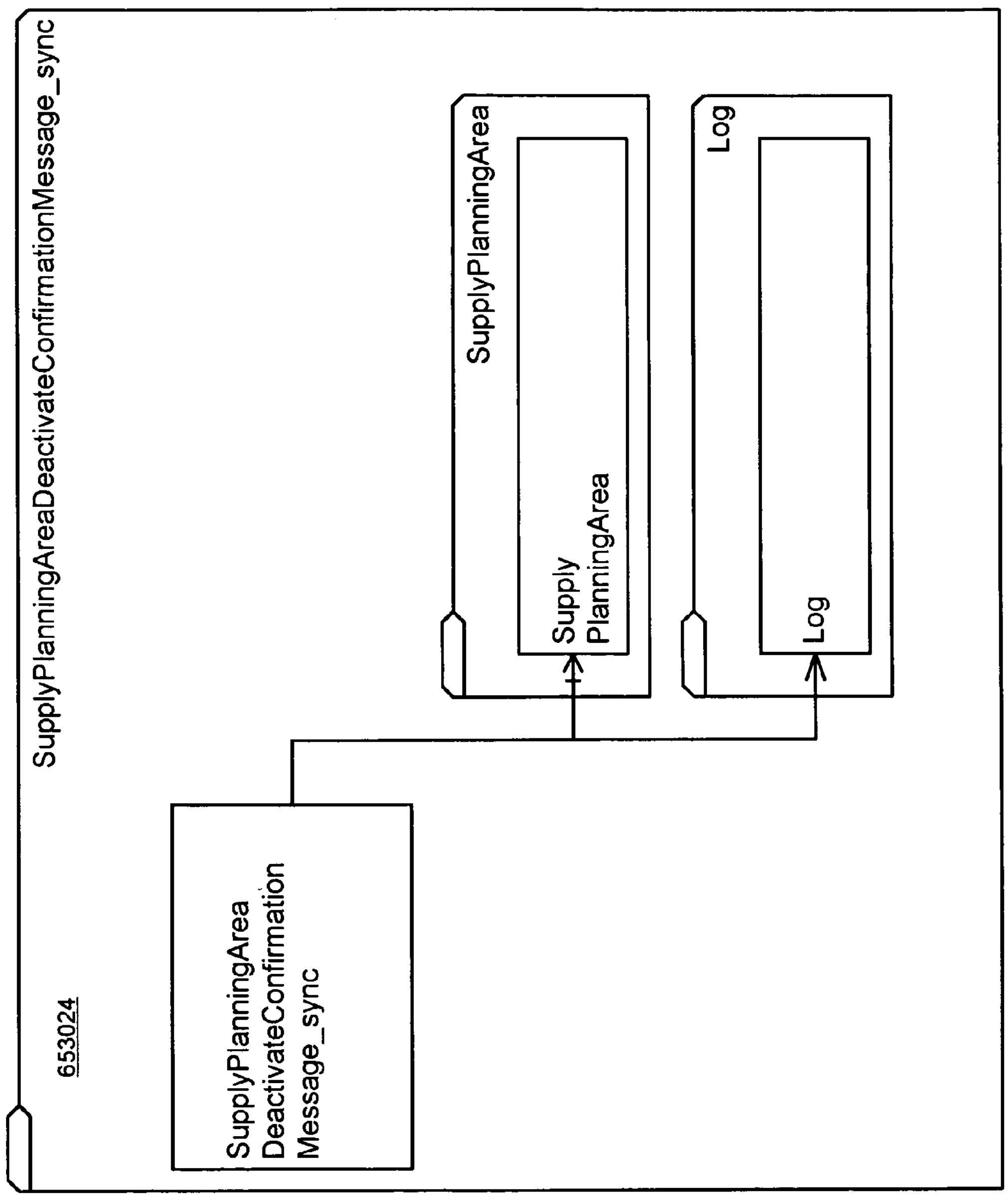
Figure 663:
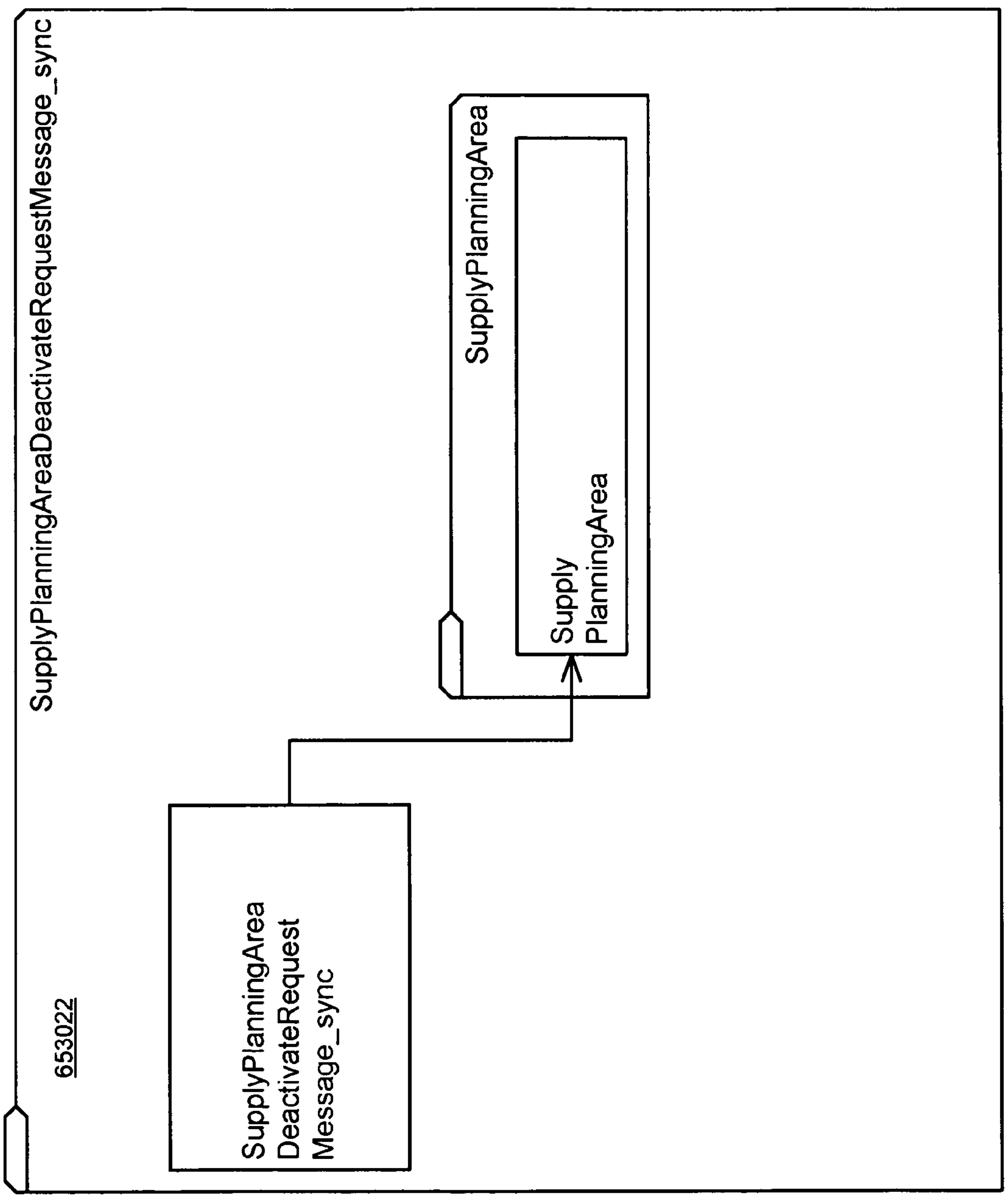
Figures 1, 674:
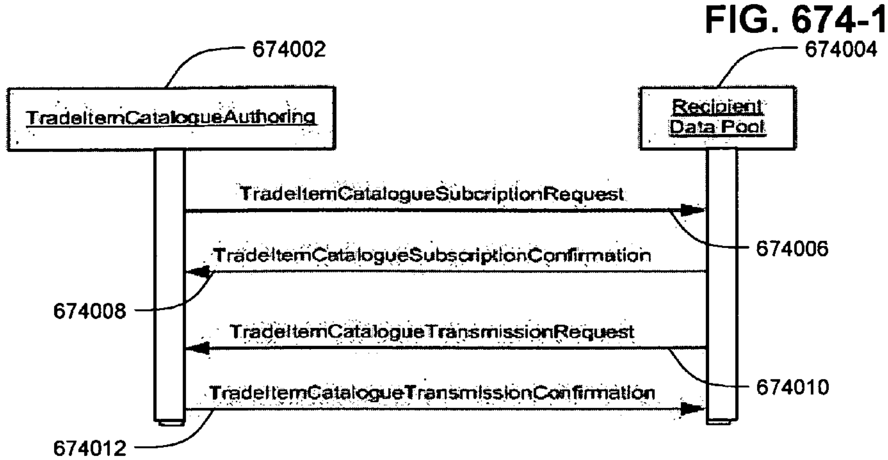
Figures 2, 674:
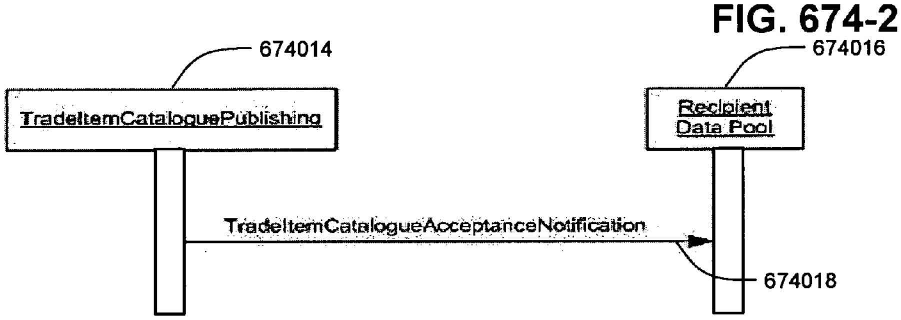
Figures 3, 674:
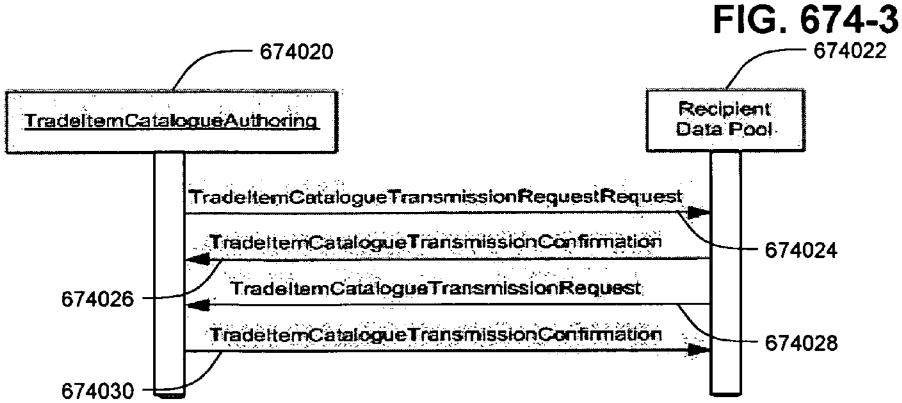
Figures 4, 674:
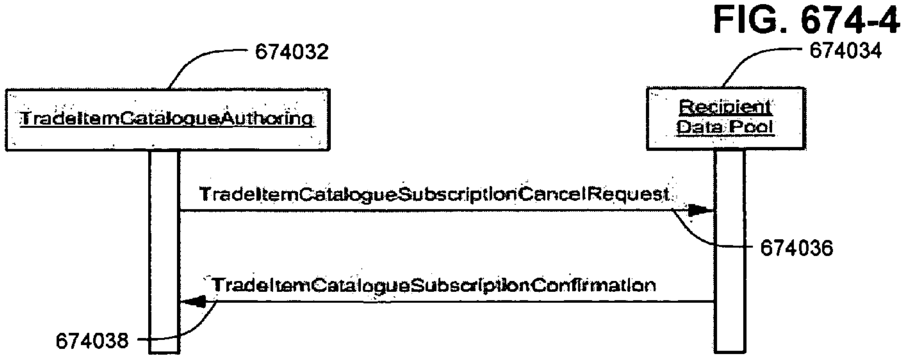

FIG. 130 shows an example CustomerRequirementExternalRequestItemChangeRequestMessage_sync Message Data Type;

FIG. 131 shows an example CustomerRequirementExternalRequestItemConfirmationMessage_sync Message Data Type;

FIG. 132 shows an example CustomerRequirementExternalRequestItemCreateRequestMessage_sync Message Data Type;

FIG. 133 shows an example CustomerRequirementAvailabilityConfirmationItemByCustomerRequirementExternalRequestItemIDQueryMessage_sync Element Structure;

FIGS. 134-1 through 134-23 show an example CustomerRequirementAvailabilityConfirmationItemByCustomerRequirementExternalRequestItemIDResponseMessage_sync Element Structure;

FIGS. 135-1 through 135-2 show an example CustomerRequirementAvailabilityConfirmationItemCancelRequestMessage_sync Element Structure;

FIGS. 136-1 through 136-9 show an example CustomerRequirementAvailabilityConfirmationItemChangeRequestMessage_sync Element Structure;

FIGS. 137-1 through 137-2 show an example CustomerRequirementAvailabilityConfirmationItemConfirmationMessage_sync Element Structure;

FIGS. 138-1 through 138-9 show an example CustomerRequirementAvailabilityConfirmationItemCreateRequestMessage_sync Element Structure;

FIG. 139 shows an example CustomerRequirementByIDQueryMessage_sync Element Structure;

FIGS. 140-1 through 140-19 show an example CustomerRequirementByIDResponseMessage_sync Element Structure;

FIG. 141 shows an example CustomerRequirementCancelRequestMessage_sync Element Structure;

FIGS. 142-1 through 142-19 show an example CustomerRequirementChangeRequestMessage_sync Element Structure;

FIG. 143 shows an example CustomerRequirementConfirmationMessage_sync Element Structure;

FIGS. 144-1 through 144-21 show an example CustomerRequirementCreateRequestMessage_sync Element Structure;

FIGS. 145-1 through 145-2 show an example CustomerRequirementExternalRequestItemCancelRequestMessage_sync Element Structure;

FIGS. 146-1 through 146-12 show an example CustomerRequirementExternalRequestItemChangeRequestMessage_sync Element Structure;

FIGS. 147-1 through 147-2 show an example CustomerRequirementExternalRequestItemConfirmationMessage_sync Element Structure;

FIGS. 148-1 through 148-13 show an example CustomerRequirementExternalRequestItemCreateRequestMessage_sync Element Structure;

FIG. 149 shows an example CustomerReturn Message Choreography;

FIG. 150 shows an example CustomerReturnBasicDataByBuyerAndBasicDataQueryMessage_sync Message Data Type;

FIGS. 151-1 through 151-3 show an example CustomerReturnBasicDataByBuyerAndBasicDataQueryMessage_sync Element Structure;

FIGS. 152-1 through 152-5 show an example CustomerReturnBasicDataByBuyerAndBasicDataResponseMessage_sync Element Structure;

FIG. 153 shows an example CustomerReturnCreateConfirmationMessage_sync Element Structure;

FIGS. 154-1 through 154-3 show an example CustomerReturnCreateRequestMessage_sync Element Structure;

FIGS. 155-1 through 155-6 show an example CustomerReturnMessage Element Structure;

FIG. 156 shows an example EquipmentResource Message Choreography;

FIG. 157 shows an example EquipmentResourceByIDQueryMessage_sync Message Data Type;

FIG. 158 shows an example EquipmentResourceByIDResponseMessage_sync Message Data Type;

FIG. 159 shows an example EquipmentResourceChangeConfirmationMessage_sync Message Data Type;

FIG. 160 shows an example EquipmentResourceChangeRequestMessage_sync Message Data Type;

FIG. 161 shows an example EquipmentResourceCreateConfirmationMessage_sync Message Data Type;

FIG. 162 shows an example EquipmentResourceCreateRequestMessage_sync Message Data Type;

FIG. 163 shows an example EquipmentResourceDeactivateConfirmationMessage_sync Message Data Type;

FIG. 164 shows an example EquipmentResourceDeactivateRequestMessage_sync Message Data Type;

FIG. 165 shows an example EquipmentResourceSimpleByLocationQueryMessage_sync Message Data Type;

FIG. 166 shows an example EquipmentResourceSimpleByLocationResponseMessage_sync Message Data Type;

FIG. 167 shows an example EquipmentResourceByIDQueryMessage_sync Element Structure;

FIG. 168 shows an example EquipmentResourceByIDResponseMessage_sync Element Structure;

FIG. 169 shows an example EquipmentResourceChangeConfirmationMessage_sync Element Structure;

FIGS. 170-1 through 170-5 show an example EquipmentResourceChangeRequestMessage_sync Element Structure;

FIG. 171 shows an example EquipmentResourceCreateConfirmationMessage_sync Element Structure;

FIGS. 172-1 through 172-5 show an example EquipmentResourceCreateRequestMessage_sync Element Structure;

FIGS. 173-1 through 173-2 show an example EquipmentResourceDeactivateConfirmationMessage_sync Element Structure;

FIG. 174 shows an example EquipmentResourceDeactivateRequestMessage_sync Element Structure;

FIG. 175 shows an example EquipmentResourcerSimpleByLocationResponseMessage_sync Element Structure;

FIG. 176 shows an example EquipmentResourceSimpleByLocationQueryMessage_sync Element Structure;

FIG. 177 shows an example FundsManagementAccount Message Choreography;

FIG. 178 shows an example FundsManagementAccountByIDQueryMessage_sync Message Data Type;

FIG. 179 shows an example FundsManagementAccountSimpleByElementsQueryMessage_sync Message Data Type;

FIGS. 180-1 through 180-2 show an example FundsManagementAccountByIDQueryMessage_sync Element Structure;

FIGS. 181-1 through 181-3 show an example FundsManagementAccountByIDResponseMessage_sync Element Structure;

FIGS. 182-1 through 182-2 show an example FundsManagementAccountChangeConfirmationMessage_sync Element Structure;

FIGS. 183-1 through 183-3 show an example FundsManagementAccountChangeRequestMessage_sync Element Structure;

FIGS. 184-1 through 184-2 show an example FundsManagementAccountCreateConfirmationMessage_sync Element Structure;

FIGS. 185-1 through 185-3 show an example FundsManagementAccountCreateRequestMessage_sync Element Structure;

FIGS. 186-1 through 186-3 show an example FundsManagementAccountMessage_sync Element Structure;

FIGS. 187-1 through 187-19 show an example FundsManagementAccountSimpleByElementsQueryMessage_sync Element Structure;

FIGS. 188-1 through 188-2 show an example FundsManagementAccountSimpleByElementsResponseMessage_sync Element Structure;

FIG. 189 shows an example GoodsMovement Message Choreography;

FIG. 190 shows an example GoodsMovementCancelConfirmationMessage_sync Message Data Type;

FIG. 191 shows an example GoodsMovementCancelRequestMessage_sync Message Data Type;

FIG. 192 shows an example GoodsMovementCreateConfirmationMessage_sync Message Data Type;

FIG. 193 shows an example GoodsMovementCreateRequestMessage_sync Message Data Type;

FIG. 194 shows an example GoodsMovementWithReferenceCreateConfirmationMessage_sync Message Data Type;

FIG. 195 shows an example GoodsMovementWithReferenceCreateRequestMessage_sync Message Data Type;

FIG. 196 shows an example GoodsMovementCancelConfirmation_sync Element Structure;

FIG. 197 shows an example GoodsMovementCancelRequest_sync Element Structure;

FIG. 198 shows an example GoodsMovementCreateConfirmation_sync Element Structure;

FIGS. 199-1 through 199-11 show an example GoodsMovementCreateRequest_sync Element Structure;

FIG. 200 shows an example GoodsMovementWithReferenceCreateConfirmation Element Structure;

FIG. 201 shows an example GoodsMovementWithReferenceCreateRequest Element Structure;

FIG. 202 shows an example InternalControlSignoff Message Choreography;

FIG. 203 shows an example InternalControlSignoffAttachmentByIDQueryMessage_sync Message Data Type;

FIG. 204 shows an example InternalControlSignoffAttachmentByIDResponseMessage_sync Message Data Type;

FIG. 205 shows an example InternalControlSignoffAttachmentCancelConfirmationMessage_sync Message Data Type;

FIG. 206 shows an example InternalControlSignoffAttachmentCancelRequestMessage_sync Message Data Type;

FIG. 207 shows an example InternalControlSignoffAttachmentCreateConfirmationMessage_sync Message Data Type;

FIG. 208 shows an example InternalControlSignoffAttachmentCreateRequestMessage_sync Message Data Type;

FIG. 209 shows an example InternalControlSignoffByIDQueryMessage_sync Message Data Type;

FIG. 210 shows an example InternalControlSignoffByIDResponseMessage_sync Message Data Type;

FIG. 211 shows an example InternalControlSignoffPerformConfirmationMessage_sync Message Data Type;

FIG. 212 shows an example InternalControlSignoffPerformRequestMessage_sync Message Data Type;

FIG. 213 shows an example SubordinateInternalControlSignoffByInternalControlSignoffQueryMessage_sync Message Data Type;

FIG. 214 shows an example SubordinateInternalControlSignoffByInternalControlSignoffResponseMessage_sync Message Data Type;

FIG. 215 shows an example InternalControlSignoffAttachmentbyIDQuery Element Structure;

FIG. 216 shows an example InternalControlSignoffAttachmentbyIDResponse Element Structure;

FIG. 217 shows an example InternalControlSignoffAttachmentCancelConfirmation Element Structure;

FIGS. 218-1 through 218-2 show an example InternalControlSignoffAttachmentCancelRequest Element Structure;

FIG. 219 shows an example InternalControlSignoffAttachmentCreateConfirmation Element Structure;

FIGS. 220-1 through 220-2 show an example InternalControlSignoffAttachmentCreateRequest Element Structure;

FIGS. 221-1 through 221-2 show an example InternalControlSignoffbyIDQuery Element Structure;

FIGS. 222-1 through 222-4 show an example InternalControlSignoffbyIDResponse Element Structure;

FIGS. 223-1 through 223-2 show an example InternalControlSignoffbyPerformRequest Element Structure;

FIG. 224 shows an example InternalControlSignoffPerformConfirmation Element Structure;

FIG. 225 shows an example MaintenanceIssueCategoryCatalogue Message Choreography;

FIG. 226 shows an example MaintenanceIssueCategoryCatalogueCategoryByIDQueryMessage_sync Message Data Type;

FIG. 227 shows an example MaintenanceIssueCategoryCatalogueCategoryByIDResponseMessage_sync Message Data Type;

FIG. 228 shows an example MaintenanceIssueCategoryCatalogueSimpleByProfileMaintenanceRequestTypeCodeQuery Message_sync Message Data Type;

FIG. 229 shows an example MaintenanceIssueCategoryCatalogueSimpleByProfileMaintenanceRequestTypeCodeResponseMessage_sync Message Data Type;

FIGS. 230-1 through 230-2 show an example MaintenanceIssueCategoryCatalogueCategoryByIDQueryMessage_sync Element Structure;

FIGS. 231-1 through 231-3 show an example MaintenanceIssueCategoryCatalogueCategoryByIDResponseMessage_sync Element Structure;

FIG. 232 shows an example MaintenanceIssueCategoryCatalogueSimpleByProfileMaintenanceRequestTypeCodeQuery Message_sync Element Structure;

FIGS. 233-1 through 233-2 show an example MaintenanceIssueCategoryCatalogueSimpleByProfileMaintenanceRequestTypeCodeResponseMessage_sync Element Structure;

FIG. 234 shows an example MaintenanceOrder Message Choreography;

FIG. 235 shows an example MaintenanceOrderAllowedMaintenancePlannerGroupByMaintenancePlanningPlantQuery Message_sync Message Data Type;

FIG. 236 shows an example MaintenanceOrderAllowedMaintenancePlannerGroupByMaintenancePlanningPlantResponseMessage_sync Message Data Type;

FIG. 237 shows an example MaintenanceOrderAllowedUserStatusByTypeQueryMessage_sync Message Data Type;

FIG. 238 shows an example MaintenanceOrderAllowedUserStatusByTypeResponseMessage_sync Message Data Type;

FIG. 239 shows an example MaintenanceOrderMessage Message Data Type;

FIG. 240 shows an example MaintenanceOrderSimpleByBasicDataQueryMessage Message Data Type;

FIG. 241 shows an example MaintenanceOrderStatusChangeMessage Message Data Type;

FIG. 242 shows an example MaintenanceOrderAllowedMaintenancePlannerGroupByMaintenancePlanningPlantQuery Message_sync Element Structure;

FIG. 243 shows an example MaintenanceOrderAllowedMaintenancePlannerGroupByMaintenancePlanningPlantResponseMessage_sync Element Structure;

FIG. 244 shows an example MaintenanceOrderAllowedUserStatusByIDQueryMessage_sync Element Structure;

FIG. 245 shows an example MaintenanceOrderAllowedUserStatusByIDResponseMessage_sync Element Structure;

FIG. 246 shows example MaintenanceOrderByIDQuery, MaintenanceOrderReleaseRequest, MaintenanceOrderReleaseCheckQuery, MaintenanceOrderTechnicalCloseRequest, and MaintenanceOrderTechnicalCloseCheckQuery Element Structure;

FIGS. 247-1 through 247-18 show an example MaintenanceOrderByIDResponse Element Structure;

FIGS. 248-1 through 248-12 show example MaintenanceOrderChangeRequest and MaintenanceOrderChangeCheckQuery Element Structures;

FIG. 249 shows example MaintenanceOrderCreateConfirmation, MaintenanceOrderCreateCheckResponse, MaintenanceOrderChangeConfirmation, MaintenanceOrderChangeCheckResponse, MaintenanceOrderReleaseConfirmation, MaintenanceOrderReleaseCheckResponse, MaintenanceOrderTechnicalCompleteConfirmation, and MaintenanceOrderTechnicalCompleteCheckResponse Element Structures;

FIGS. 250-1 through 250-12 show example MaintenanceOrderCreateRequest and MaintenanceOrderCreateCheckQuery Element Structures;

FIGS. 251-1 through 251-5 show an example MaintenanceOrderSimpleByBasicDataQuery Element Structure;

FIG. 252 shows an example MaintenanceOrderSimpleByBasicDataResponse Element Structure;

FIG. 253 shows an example MaintenanceRequest Message Choreography;

FIG. 254 shows an example MaintenanceRequestByIDQueryMessage_sync Message Data Type;

FIG. 255 shows an example MaintenanceRequestChangeCheckQueryMessage_sync Message Data Type;

FIG. 256 shows an example MaintenanceRequestChangeCheckResponseMessage_sync Message Data Type;

FIG. 257 shows an example MaintenanceRequestChangeConfirmationMessage_sync Message Data Type;

FIG. 258 shows an example MaintenaceRequestChangeRequestMessage_sync Message Data Type;

FIG. 259 shows an example MaintenanceRequestCloseConfirmationMessage_sync Message Data Type;

FIG. 260 shows an example MaintenanceRequestCloseRequestMessage_sync Message Data Type;

FIG. 261 shows an example MaintenanceRequestCreateConfirmationMessage_sync Message Data Type;

FIG. 262 shows an example MaintenanceRequestCreateRequestMessage_sync Message Data Type;

FIG. 263 shows an example MaintenanceRequestImportanceCodeByTypeCodeQueryMessage_sync Message Data Type;

FIG. 264 shows an example MaintenanceRequestImportanceCodeByTypeCodeResponseMessage_sync Message Data Type;

FIG. 265 shows an example MaintenanceRequestReleaseConfirmationMessage_sync Message Data Type;

FIG. 266 shows an example MaintenanceRequestReleaseRequestMessage_sync Message Data Type;

FIG. 267 shows an example MaintenanceRequestSimpleByIndividualMaterialAndInstallationPointQueryMessage_sync Message Data Type;

FIG. 268 shows an example MaintenanceRequestSimpleByIndividualMaterialAndInstallationPointResponseMessage_syn Message Data Type;

FIGS. 269-1 through 269-2 show an example MaintenanceRequestAllowedActivityGroupAndActivityByElementsQueryMessage_sync Element Structure;

FIGS. 270-1 through 270-2 show an example MaintenanceRequestAllowedActivityGroupAndActivityByElementsResponseMessage_sync Element Structure;

FIGS. 271-1 through 271-2 show an example MaintenanceRequestAllowedIssueCauseGroupAndIssueCauseByElementsResponseMessage_sync Element Structure;

FIGS. 272-1 through 272-2 show an example MaintenanceRequestAllowedIssueGroupAndIssueByElementsQueryMessage_sync Element Structure;

FIGS. 273-1 through 273-2 show an example MaintenanceRequestAllowedIssueGroupAndIssueByElementsResponseMessage_sync Element Structure;

FIGS. 274-1 through 274-2 show an example MaintenanceRequestAllowedProductPartGroupAndProductPartByElementsQueryMessage_sync Element Structure;

FIGS. 275-1 through 275-2 show an example MaintenanceRequestAllowedProductPartGroupAndProductPartByElementsResponseMessage_sync Element Structure;

FIGS. 276-1 through 276-2 show an example MaintenanceRequestAllowedTaskGroupAndTaskByElementsQueryMessage_sync Element Structure;

FIGS. 277-1 through 277-2 show an example MaintenanceRequestAllowedTaskGroupAndTaskByElementsResponseMessage_sync Element Structure;

FIG. 278 shows an example MaintenanceRequestByIDQueryMessage_sync Element Structure;

FIGS. 279-1 through 279-28 show an example MaintenanceRequestByIDResponseMessage_sync Element Structure;

FIGS. 280-1 through 280-20 show an example MaintenanceRequestChangeCheckQueryMessage_sync Element Structure;

FIG. 281 shows an example MaintenanceRequestChangeCheckResponseMessage_sync Element Structure;

FIG. 282 shows an example MaintenanceRequestChangeConfirmationMessage_sync Element Structure;

FIGS. 283-1 through 283-20 show an example MaintenanceRequestChangeRequestMessage_sync Element Structure;

FIG. 284 shows an example MaintenanceRequestChangeStatusMessage Element Structure;

FIG. 285 shows an example MaintenanceRequestCloseConfirmationMessage_sync Element Structure;

FIG. 286 shows an example MaintenanceRequestCloseRequestMessage_sync Element Structure;

FIG. 287 shows an example MaintenanceRequestCreateConfirmationMessage_sync Element Structure;

FIGS. 288-1 through 288-17 show an example MaintenanceRequestCreateRequestMessage_sync Element Structure;

FIG. 289 shows an example MaintenanceRequestImportanceCodeByTypeCodeQueryMessage_sync Element Structure;

FIG. 290 shows an example MaintenanceRequestImportanceCodeByTypeCodeResponseMessage_sync Element Structure;

FIG. 291 shows an example MaintenanceRequestReleaseConfirmationMessage_sync Element Structure;

FIG. 292 shows an example MaintenanceRequestReleaseRequestMessage_sync Element Structure;

FIG. 293 shows an example MaintenanceRequestSimpleByIndividualMaterialAndInstallationPointQueryMessage_sync Element Structure;

FIGS. 294-1 through 294-2 show an example MaintenanceRequestSimpleByIndividualMaterialAndInstallationPointResponseMessage_sync Element Structure;

FIG. 295 shows an example ManagementControlAssessment Message Choreography;

FIG. 296 shows an example ManagementControlAssessmentByElementsQueryMessage_sync Message Data Type;

FIG. 297 shows an example ManagementControlAssessmentByElementsResponseMessage_sync Message Data Type;

FIG. 298 shows an example ManagementControlAssessmentByIDQueryMessage_sync Message Data Type;

FIG. 299 shows an example ManagementControlAssessmentByIDResponseMessage_sync Message Data Type;

FIG. 300 shows an example ManagementControlAssessmentChangeConfirmationMessage_sync Message Data Type;

FIG. 301 shows an example ManagementControlAssessmentChangeRequestMessage_sync Message Data Type;

FIG. 302 shows an example Material Message Choreography;

FIG. 303 shows an example MaterialBasicDataByIDQueryMessage_sync Message Data Type;

FIG. 304 shows an example MaterialBasicDataByIDResponseMessage_sync Message Data Type;

FIG. 305 shows an example MaterialSalesSpecificationByElementsQueryMessage_sync Message Data Type;

FIG. 306 shows an example MaterialSalesSpecificationByElementsResponseMessage_sync Message Data Type;

FIG. 307 shows an example MaterialSalesSpecificationByIDQueryMessage_sync Message Data Type;

FIG. 308 shows an example MaterialSalesSpecificationByIDResponseMessage_Message Data Type;

FIG. 309 shows an example MaterialSimpleByGTINQueryMessage_sync Message Data Type;

FIG. 310 shows an example MaterialSimpleByIDAndDescriptionQueryMessage_sync Message Data Type;

FIG. 311 shows an example MaterialSimpleBySearchtextQueryMessage_sync Message Data Type;

FIG. 312 shows an example MaterialSimpleResponseMessage Message Data Type;

FIG. 313 shows an example MaterialBasicDataByIDQueryMessage_sync Element Structure;

FIGS. 314-1 through 314-5 show an example MaterialBasicDataByIDResponseMessage_sync Element Structure;

FIGS. 315-1 through 315-6 show an example MaterialSalesSpecificationByElementsQueryMessage_sync Element Structure;

FIGS. 316-1 through 316-2 show an example MaterialSalesSpecificationByElementsResponseMessage_sync Element Structure;

FIG. 317 shows an example MaterialSalesSpecificationByIDQueryMessage_sync Element Structure;

FIGS. 318-1 through 318-3 show an example MaterialSalesSpecificationByIDResponseMessage_sync Element Structure;

FIG. 319 shows an example MaterialSimpleByGTINQueryMessage_sync Element Structure;

FIG. 320 shows an example MaterialSimpleByGTINResponseMessage_sync Element Structure;

FIGS. 321-1 through 321-4 show an example MaterialSimpleByIDAndDescriptionQueryMessage_sync Element Structure;

FIG. 322 shows an example MaterialSimpleByIDAndDescriptionResponseMessage_sync Element Structure;

FIG. 323 shows an example MaterialSimpleBySearchtextQueryMessage_sync Element Structure;

FIG. 324 shows an example MaterialSimpleBySearchtextResponseMessage_sync Element Structure;

FIG. 325 shows an example MaterialSimpleResponseMessage Element Structure;

FIG. 326 shows an example MaterialInspection Message Choreography;

FIG. 327 shows an example MaterialInspectionBasicDataByElementsQueryMessage_sync Message Data Type;

FIG. 328 shows an example MaterialInspectionBasicDataByElementsResponseMessage_sync Message Data Type;

FIG. 329 shows an example MaterialInspectionByIDQueryMessage_sync Message Data Type;

FIG. 330 shows an example MaterialInspectionByIDResponseMessage_sync Message Data Type;

FIG. 331 shows an example MaterialInspectionDecisionCreateConfirmationMessage_sync Message Data Type;

FIG. 332 shows an example MaterialInspectionDecisionCreateRequestMessage_sync Message Data Type;

FIG. 333 shows an example MaterialInspectionSubsetCreateConfirmationMessage_sync Message Data Type;

FIG. 334 shows an example MaterialInspectionSubsetCreateRequestMessage_sync Message Data Type;

FIG. 335 shows an example MaterialInspectionSubsetDecisionCreateConfirmationMessage_sync Message Data Type;

FIG. 336 shows an example MaterialInspectionSubsetDecisionCreateRequestMessage_sync Message Data Type;

FIG. 337 shows an example MaterialInspectionSubsetOperationByElementsQueryMessage_sync Message Data Type;

FIG. 338 shows an example MaterialInspectionSubsetOperationByElementsResponseMessage_sync Message Data Type;

FIG. 339 shows an example MaterialInspectionSubsetOperationInspectionActivityBasicDataByElementsQueryMessage_sync Message Data Type;

FIG. 340 shows an example MaterialInspectionSubsetOperationInspectionActivityBasicDataByElementsResponseMessage_sync Message Data Type;

FIG. 341 shows an example MaterialInspectionSubsetOperationInspectionActivityByIDQueryMessage_sync Message Data Type;

FIG. 342 shows an example MaterialInspectionSubsetOperationInspectionActivityByIDResponseMessage_sync Message Data Type;

FIG. 343 shows an example MaterialInspectionSubsetOperationInspectionActivityCreateConfirmationMessage_sync Message Data Type;

FIG. 344 shows an example MaterialInspectionSubsetOperationInspectionActivityCreateRequestMessage_sync Message Data Type;

FIG. 345 shows an example MaterialInspectionSubsetOperationInspectionActivityFindingCreateConfirmationMessage_sync Message Data Type;

FIG. 346 shows an example MaterialInspectionSubsetOperationInspectionActivityFindingCreateRequestMessage_sync Message Data Type;

FIG. 347 shows an example MaterialInspectionSubsetOperationInspectionActivityResultRecordingConfirmationMessage_sync Message Data Type;

FIG. 348 shows an example MaterialInspectionSubsetOperationInspectionActivityResultRecordingRequestMessage_sync Message Data Type;

FIGS. 349-1 through 349-6 show an example MaterialInspectionBasicDataByElementsQueryMessage_sync Element Structure;

FIGS. 350-1 through 350-7 show an example MaterialInspectionBasicDataByElementsResponseMessage_sync Element Structure;

FIG. 351 shows an example MaterialInspectionByIDQueryMessage_sync Element Structure;

FIGS. 352-1 through 352-11 show an example MaterialInspectionByIDResponseMessage_sync Element Structure;

FIGS. 353-1 through 353-3 show an example MaterialInspectionDecisionCreateConfirmationMessage_sync Element Structure;

FIGS. 354-1 through 354-2 show an example MaterialInspectionDecisionCreateRequestMessage_sync Element Structure;

FIG. 355 shows an example MaterialInspectionSubsetCreateConfirmationMessage_sync Element Structure;

FIGS. 356-1 through 356-3 show an example MaterialInspectionSubsetCreateRequestMessage_sync Element Structure;

FIGS. 357-1 through 357-3 show an example MaterialInspectionSubsetDecisionCreateConfirmationMessage_sync Element Structure;

FIGS. 358-1 through 358-2 show an example MaterialInspectionSubsetDecisionCreateRequestMessage_sync Element Structure;

FIGS. 359-1 through 359-6 show an example MaterialInspectionSubsetOperationByElementsQueryMessage_sync Element Structure;

FIGS. 360-1 through 360-5 show an example MaterialInspectionSubsetOperationByElementsResponseMessage_sync Element Structure;

FIGS. 361-1 through 361-8 show an example MaterialInspectionSubsetOperationInspectionActivityBasicDataByElementsQueryMessage_sync Element Structure;

FIGS. 362-1 through 362-5 show an example MaterialInspectionSubsetOperationInspectionActivityBasicDataByElementsResponseMessage_sync Element Structure;

FIGS. 363-1 through 363-2 show an example MaterialInspectionSubsetOperationInspectionActivityByIDQueryMessage_sync Element Structure;

FIGS. 364-1 through 364-17 show an example MaterialInspectionSubsetOperationInspectionActivityByIDResponseMessage_sync Element Structure;

FIGS. 365-1 through 365-2 show an example MaterialInspectionSubsetOperationInspectionActivityCreateConfirmationMessage_sync Element Structure;

FIGS. 366-1 through 366-4 show an example MaterialInspectionSubsetOperationInspectionActivityCreateRequestMessage_sync Element Structure;

FIGS. 367-1 through 367-3 show an example MaterialInspectionSubsetOperationInspectionActivityFindingCreateConfirmationMessage_sync Element Structure;

FIGS. 368-1 through 368-6 show an example MaterialInspectionSubsetOperationInspectionActivityFindingCreateRequestMessage_sync Element Structure;

FIGS. 369-1 through 369-3 show an example MaterialInspectionSubsetOperationInspectionActivityResultRecordingConfirmationMessage_sync Element Structure;

FIGS. 370-1 through 370-5 show an example MaterialInspectionSubsetOperationInspectionActivityResultRecordingRequestMessage_sync Element Structure;

FIG. 371 shows an example MaterialInspectionSample Message Choreography;

FIG. 372 shows an example MaterialInspectionSampleByElementsQueryMessage_sync Message Data Type;

FIG. 373 shows an example MaterialInspectionSampleByElementsResponseMessage_sync Message Data Type;

FIG. 374 shows an example MaterialInspectionSampleCreateConfirmationMessage_sync Message Data Type;

FIG. 375 shows an example MaterialInspectionSampleCreateRequestMessage_sync Message Data Type;

FIGS. 376-1 through 376-2 show an example MaterialInspectionSampleByElementsQueryMessage_sync Element Structure;

FIGS. 377-1 through 377-4 show an example MaterialInspectionSampleByElementsResponseMessage_sync Element Structure;

FIG. 378 shows an example MaterialInspectionSampleCreateConfirmationMessage_sync Element Structure;

FIGS. 379-1 through 379-3 show an example MaterialInspectionSampleCreateRequestMessage_sync Element Structure;

FIG. 380 shows an example PaymentCardPaymentAuthorisation Message Choreography;

FIG. 381 shows an example PaymentCardPaymentAuthorisationCancelConfirmationMessage_sync Message Data Type;

FIG. 382 shows an example PaymentCardPaymentAuthorisationCancelRequestMessage_sync Message Data Type;

FIG. 383 shows an example PaymentCardPaymentAuthorisationConfirmationMessage_sync Message Data Type;

FIG. 384 shows an example PaymentCardPaymentAuthorisationPreAuthorisationQueryMessage_sync Message Data Type;

FIG. 385 shows an example PaymentCardPaymentAuthorisationPreAuthorisationResponseMessage_sync Message Data Type;

FIG. 386 shows an example PaymentCardPaymentAuthorisationRequestMessage_sync Message Data Type;

FIG. 387 shows an example ProcurementPlanningOrder Message Choreography;

FIG. 388 shows an example ProcurementPlanningOrderByElementsQueryMessage_sync Message Data Type;

FIG. 389 shows an example ProcurementPlanningOrderByElementsResponseMessage_sync Message Data Type;

FIG. 390 shows an example ProcurementPlanningOrderByIDQueryMessage_sync Message Data Type;

FIG. 391 shows an example ProcurementPlanningOrderByIDResponseMessage_sync Message Data Type;

FIG. 392 shows an example ProcurementPlanningOrderCancelConfirmationMessage_sync Message Data Type;

FIG. 393 shows an example ProcurementPlanningOrderCancelRequestMessage_sync Message Data Type;

FIG. 394 shows an example ProcurementPlanningOrderChangeConfirmationMessage_sync Message Data Type;

FIG. 395 shows an example ProcurementPlanningOrderChangeRequestMessage_sync Message Data Type;

FIG. 396 shows an example ProcurementPlanningOrderCreateConfirmationMessage_sync Message Data Type;

FIG. 397 shows an example ProcurementPlanningOrderCreateRequestMessage_sync Message Data Type;

FIGS. 398-1 through 398-8 show an example ProcurementPlanningOrderByElementsQueryMessage_sync Element Structure;

FIGS. 399-1 through 399-5 show an example ProcurementPlanningOrderByElementsResponseMessage_sync Element Structure;

FIGS. 400-1 through 400-4 show an example ProcurementPlanningOrderByIDQueryMessage_sync Element Structure;

FIGS. 401-1 through 401-5 show an example ProcurementPlanningOrderByIDResponseMessage_sync Element Structure;

FIGS. 402-1 through 402-2 show an example ProcurementPlanningOrderCancelConfirmationMessage_sync Element Structure;

FIGS. 403-1 through 403-4 show an example ProcurementPlanningOrderCancelRequestMessage_sync Element Structure;

FIGS. 404-1 through 404-2 show an example ProcurementPlanningOrderChangeConfirmationMessage_sync Element Structure;

FIGS. 405-1 through 405-5 show an example ProcurementPlanningOrderChangeRequestMessage_sync Element Structure;

FIGS. 406-1 through 406-2 show an example ProcurementPlanningOrderCreateConfirmationMessage_sync Element Structure;

FIGS. 407-1 through 407-6 show an example ProcurementPlanningOrderCreateRequestMessage_sync Element Structure;

FIG. 408 shows an example ProductionBillOfMaterial Message Choreography;

FIG. 409 shows an example ProductionBillOfMaterialVariantBasicDataByMaterialAndPlantQueryMessage_sync Message Data Type;

FIG. 410 shows an example ProductionBillOfMaterialVariantBasicDataByMateriaLkndPlantResponseMessage_sync Message Data Type;

FIG. 411 shows an example ProductionBillOfMaterialVariantItemBasicDataByVariantIdentifyingElementsQueryMessage_sync Message Data Type;

FIG. 412 shows an example ProductionBillOfMaterialVariantItemBasicDataByVariantIdentifyingElementsResponseMessage_sync Message Data Type;

FIG. 413 shows an example ProductionBillOfMaterialVariantItemByVariantIdentifyingElementsQueryMessage_sync Message Data Type;

FIG. 414 shows an example ProductionBillOfMaterialVariantItemByVariantIdentifyingElementsResponseMessage_sync Message Data Type;

FIGS. 415-1 through 415-2 show an example ProductionBillOfMaterialVariantBasicDataByMaterialAndPlantQueryMessage_sync Element Structure;

FIGS. 416-1 through 416-3 show an example ProductionBillOfMaterialVariantBasicDataByMaterialAndPlantResponseMessage_sync Element Structure;

FIGS. 417-1 through 417-2 show an example ProductionBillOfMaterialVariantItemBasicDataByVariantIdentifyingElementsQueryMessage_sync Element Structure;

FIGS. 418-1 through 418-10 show an example ProductionBillOfMaterialVariantItemByVariantIdentifyingElementsResponseMessage_sync Element Structure;

FIG. 419 shows an example ProductionConfirmation Message Choreography;

FIG. 420 shows an example ProductionConfirmationCancelConfirmationMessage_sync Message Data Type;

FIG. 421 shows an example ProductionConfirmationCancelRequestMessage_sync Message Data Type;

FIG. 422 shows an example ProductionConfirmationCreateConfirmationMessage Message Data Type;

FIG. 423 shows an example ProductionConfirmationCreateRequestMessage Message Data Type;

FIG. 424 shows an example ProductionConfirmationCancelConfirmationMessage_sync Element Structure;

FIG. 425 shows an example ProductionConfirmationCancelRequestMessage_sync Element Structure;

FIGS. 426-1 through 426-2 show an example ProductionConfirmationCreateConfirmationMessage Element Structure;

FIGS. 427-1 through 427-2 show an example ProductionConfirmationCreateConfirmationMessage_sync Element Structure;

FIGS. 428-1 through 428-16 show an example ProductionConfirmationCreateRequestMessage Element Structure;

FIGS. 429-1 through 429-13 show an example ProductionConfirmationCreateRequestMessage_sync Element Structure;

FIG. 430 shows an example ProductionOrder Message Choreography;

FIG. 431 shows an example ProductionOrderByIDQuery_sync Message Data Type;

FIG. 432 shows an example ProductionOrderByIDResponse_sync Message Data Type;

FIG. 433 shows an example ProductionOrderSimpleByElementsQuery_sync Message Data Type;

FIG. 434 shows an example ProductionOrderSimpleByElementsResponse_sync Message Data Type;

FIG. 435 shows an example ProductionOrderSimpleByWorkCentreQuery_sync Message Data Type;

FIG. 436 shows an example ProductionOrderSimpleByWorkCentreResponse_sync Message Data Type;

FIG. 437 shows an example ProductionOrderByIDQuery Element Structure;

FIGS. 438-1 through 438-39 show an example ProductionOrderByIDResponse Element Structure;

FIGS. 439-1 through 439-10 show an example ProductionOrderElementsQuery Element Structure;

FIG. 440 shows an example ProductionOrderElementsResponse Element Structure;

FIGS. 441-1 through 441-3 show an example ProductionOrderWorkCentreQuery Element Structure;

FIG. 442 shows an example ProductionOrderWorkCentreResponse Element Structure;

FIG. 443 shows an example ProductionPlanningOrder Message Choreography;

FIG. 444 shows an example ProductionPlanningOrderByIDQueryMessage_sync Message Data Type;

FIG. 445 shows an example ProductionPlanningOrderByIDResponseMessage_sync Message Data Type;

FIG. 446 shows an example ProductionPlanningOrderSimpleByElementsQueryMessage_sync Message Data Type;

FIG. 447 shows an example ProductionPlanningOrderSimpleByElementsResponseMessage_sync Message Data Type;

FIG. 448 shows an example ProductionPlanningOrderByIDQueryMessage_sync Element Structure;

FIGS. 449-1 through 449-21 show an example ProductionPlanningOrderByIDResponseMessage_sync Element Structure;

FIGS. 450-1 through 450-6 show an example ProductionPlanningOrderSimpleByElementsQueryMessage_sync Element Structure;

FIG. 451 shows an example ProductionPlanningOrderSimpleByElementsResponseMessage_sync Element Structure;

FIG. 452 shows an example ProductionPlanningOrder Message Choreography;

FIG. 453 shows an example ProductionPlanningOrderByIDQueryMessage_sync Message Data Type;

FIG. 454 shows an example ProductionPlanningOrderByIDResponseMessage_sync Message Data Type;

FIG. 455 shows an example ProductionPlanningOrderCancelConfirmationMessage_sync Message Data Type;

FIG. 456 shows an example ProductionPlanningOrderCancelRequestMessage_sync Message Data Type;

FIG. 457 shows an example ProductionPlanningOrderChangeConfirmationMessage_sync Message Data Type;

FIG. 458 shows an example ProductionPlanningOrderChangeRequestMessage_sync Message Data Type;

FIG. 459 shows an example ProductionPlanningOrderCreateConfirmationMessage_sync Message Data Type;

FIG. 460 shows an example ProductionPlanningOrderCreateRequestMessage_sync Message Data Type;

FIG. 461 shows an example ProductionPlanningOrderSimpleByElementsQueryMessage_sync Message Data Type;

FIG. 462 shows an example ProductionPlanningOrderSimpleByElementsResponseMessage_sync Message Data Type;

FIGS. 463-1 through 463-27 show an example ProductionPlanningOrderByIDResponsetMessage_sync Element Structure;

FIGS. 464-1 through 464-6 show an example ProductionPlanningOrderChangeRequestMessage_sync Element Structure;

FIG. 465 shows an example ProductionPlanningOrderByIDQueryMessage_sync Element Structure;

FIG. 466 shows an example ProductionPlanningOrderCancelConfirmationMessage_sync Element Structure;

FIG. 467 shows an example ProductionPlanningOrderCancelRequestMessage_sync Element Structure;

FIG. 468 shows an example ProductionPlanningOrderChangeConfirmationMessage_sync Element Structure;

FIG. 469 shows an example ProductionPlanningOrderCreateConfirmationMessage_sync Element Structure;

FIGS. 470-1 through 470-4 show an example ProductionPlanningOrderCreateRequestMessage_sync Element Structure;

FIGS. 471-1 through 471-6 show an example ProductionPlanningOrderSimpleByElementsQueryMessage_sync Element Structure;

FIG. 472 shows an example ProductionPlanningOrderSimpleByElementsResponseMessage_sync Element Structure;

FIG. 473 shows an example ProductionProposal Message Choreography;

FIG. 474 shows an example ProductionProposalByElementsQueryMessage_sync Message Data Type;

FIG. 475 shows an example ProductionProposalByElementsResponseMessage_sync Message Data Type;

FIG. 476 shows an example ProductionProposalByIDQueryMessage_sync Message Data Type;

FIG. 477 shows an example ProductionProposalByIDResponseMessage_sync Message Data Type;

FIG. 478 shows an example ProductionProposalCancelConfirmationMessage_sync Message Data Type;

FIG. 479 shows an example ProductionProposalCancelRequestMessage_sync Message Data Type;

FIG. 480 shows an example ProductionProposalChangeConfirmationMessage_sync Message Data Type;

FIG. 481 shows an example ProductionProposalChangeRequestMessage_sync Message Data Type;

FIG. 482 shows an example ProductionProposalCreateConfirmationMessage_sync Message Data Type;

FIG. 483 shows an example ProductionProposalCreateRequestMessage_sync Message Data Type;

FIGS. 484-1 through 484-11 show an example ProductionProposalByElementsQueryMessage_sync Element Structure;

FIGS. 485-1 through 485-8 show an example ProductionProposalByElementsResponseMessage_sync Element Structure;

FIGS. 486-1 through 486-5 show an example ProductionProposalByIDQueryMessage_sync Element Structure;

FIGS. 487-1 through 487-8 show an example ProductionProposalByIDResponseMessage_sync Element Structure;

FIGS. 488-1 through 488-4 show an example ProductionProposalCancelConfirmationMessage_sync Element Structure;

FIGS. 489-1 through 489-4 show an example ProductionProposalCancelRequestMessage_sync Element Structure;

FIGS. 490-1 through 490-4 show an example ProductionProposalChangeConfirmationMessage_sync Element Structure;

FIGS. 491-1 through 491-5 show an example ProductionProposalChangeRequestMessage_sync Element Structure;

FIGS. 492-1 through 492-4 show an example ProductionProposalCreateConfirmationMessage_sync Element Structure;

FIGS. 493-1 through 493-6 show an example ProductionProposalCreateRequestMessage_sync Element Structure;

FIG. 494 shows an example Project Message Choreography;

FIG. 495 shows an example ProjectActivityAttachmentByActivityIDAndNetworkIDQueryMessage_sync Message Data Type;

FIG. 496 shows an example ProjectActivityAttachmentByActivityIDNetworkIDResponseMessage_sync Message Data Type;

FIG. 497 shows an example ProjectActivityByActivityIDQueryMessage_sync Message Data Type;

FIG. 498 shows an example ProjectActivityByActivityIDResponseMessage_sync Message Data Type;

FIG. 499 shows an example ProjectActivityByWorkBreakdownStructureElementIDQueryMessage_sync Message Data Type;

FIG. 500 shows an example ProjectActivityByWorkBreakdownStructureElementIDResponseMessage_sync Message Data Type;

FIG. 501 shows an example ProjectActivityChangeCheckQueryMessage_sync Message Data Type;

FIG. 502 shows an example ProjectActivityChangeCheckResponseMessage_sync Message Data Type;

FIG. 503 shows an example ProjectActivityChangeConfirmationMessage_sync Message Data Type;

FIG. 504 shows an example ProjectActivityChangeRequestMessage_sync Message Data Type;

FIG. 505 shows an example ProjectByPartyQueryMessage_sync Message Data Type;

FIG. 506 shows an example ProjectByPartyResponseMessage_sync Message Data Type;

FIG. 507 shows an example ProjectDescriptionByIDQueryMessage_sync Message Data Type;

FIG. 508 shows an example ProjectDescriptionByIDResponseMessage_sync Message Data Type;

FIG. 509 shows an example ProjectPartyByIDAndPartyRoleCodeQueryMessage_sync Message Data Type;

FIG. 510 shows an example ProjectPartyByIDAndPartyRoleCodeResponseMessage_sync Message Data Type;

FIG. 511 shows an example ProjectWorkBreakdownStructureElementAttachmentByWorkBreakdownStructureElementIDQueryMessage_sync Message Data Type;

FIG. 512 shows an example ProjectWorkBreakdownStructureElementAttachmentByWorkBreakdownStructureElementIDResponseMessage_sync Message Data Type;

FIG. 513 shows an example ProjectWorkBreakdownStructureElementByIDQueryMessage_sync Message Data Type;

FIG. 514 shows an example ProjectWorkBreakdownStructureElementByIDResponseMessage_sync Message Data Type;

FIG. 515 shows an example ProjectWorkBreakdownStructureElementByWorkBreakdownStructureElementIDQueryMessage_sync Message Data Type;

FIG. 516 shows an example ProjectWorkBreakdownStructureElementByWorkBreakdownStructureElementIDResponse Message_sync Message Data Type;

FIG. 517 shows an example ProjectActivityAttachmentByActivityIDAndNetworkIDQueryMessage Element Structure;

FIGS. 518-1 through 518-2 show an example ProjectActivityAttachmentByActivityIDAndNetworkIDResponseMessage Element Structure;

FIG. 519 shows an example ProjectActivityByActivityIDQueryMessage Element Structure;

FIGS. 520-1 through 520-3 show an example ProjectActivityByActivityIDResponse Element Structure;

FIG. 521 shows an example ProjectActivityByWorkBreakdownStructureElementIDQueryMessage Element Structure;

FIG. 522 shows an example ProjectActivityByWorkBreakdownStructureElementIDResponse Element Structure;

FIGS. 523-1 through 523-2 show an example ProjectActivityChangeCheckQuery Element Structure;

FIG. 524 shows an example ProjectActivityChangeCheckResponse Element Structure;

FIG. 525 shows an example ProjectActivityChangeConfirmation Element Structure;

FIGS. 526-1 through 526-2 show an example ProjectActivityChangeRequest Element Structure;

FIG. 527 shows an example ProjectByPartyQueryMessage_sync Element Structure;

FIG. 528 shows an example ProjectByPartyResponseMessage Element Structure;

FIG. 529 shows an example ProjectDescriptionByIDQueryMessage Element Structure;

FIG. 530 shows an example ProjectDescriptionByID-Response Element Structure;

FIGS. 531-1 through 531-5 show an example ProjectMessage Element Structure;

FIG. 532 shows an example ProjectPartyByIDAndRoleCodeQueryMessage Element Structure;

FIGS. 533-1 through 533-5 show an example ProjectPartyByIDAndRoleCodeResponseMessage Element Structure;

FIG. 534 shows an example ProjectWorkBreakdownStructureElementAttachmentByWorkBreakdownStructureElementIDQueryMessage Element Structure;

FIGS. 535-1 through 535-2 show an example ProjectWorkBreakdownStructureElementAttachmentByWorkBreakdownStructureElementIDResponseMessage Element Structure;

FIG. 536 shows an example ProjectWorkBreakdownStructureElementByIDQueryMessage Element Structure;

FIG. 537 shows an example ProjectWorkBreakdownStructureElementByIDResponse Element Structure;

FIG. 538 shows an example ProjectWorkBreakdownStructureElementByWorkBreakdownStructureElementIDQueryMessage Element Structure;

FIGS. 539-1 through 539-2 show an example ProjectWorkBreakdownStructureElementByWorkBreakdownStructureElementIDResponse Element Structure;

FIG. 540 shows an example Project Change Message Choreography;

FIG. 541 shows an example ProjectChangeCreateConfirmationMessage Message Data Type;

FIG. 542 shows an example ProjectChangeCreateRequestMessage Message Data Type;

FIG. 543 shows an example ProjectChangeCreateConfirmationMessage_sync Element Structure;

FIGS. 544-1 through 544-9 show an example ProjectChangeCreateRequestMessage_sync Element Structure;

FIG. 545 shows an example ProjectIssueCategoryCatalogue Message Choreography;

FIG. 546 shows an example ProjectIssueCategoryCatalogueCategoryByIDQueryMessage_sync Message Data Type;

FIG. 547 show an example ProjectIssueCategoryCatalogueCategoryByIDResponseMessage_sync Message Data Type;

FIG. 548 shows an example ProjectIssueCategoryCatalogueSimpleByProfileProjectChangeTypeCodeQueryMessage_sync Message Data Type;

FIG. 549 shows an example ProjectIssueCategoryCatalogueSimpleByProfileProjectChangeTypeCodeResponseMessage_sync Message Data Type;

FIG. 550 shows an example ProjectIssueCategoryCatalogueCategoryByIDQueryMessage_sync Element Structure;

FIGS. 551-1 through 551-3 show an example ProjectIssueCategoryCatalogueCategoryByIDResponse_sync Element Structure;

FIG. 552 shows an example ProjectIssueCategoryCatalogueSimpleByProfileProjectChangeTypeCodeQueryMessage_sync Element Structure;

FIGS. 553-1 through 553-2 show an example ProjectIssueCategoryCatalogueSimpleByProfileProjectChangeTypeCodeResponseMessage_sync Element Structure;

FIG. 554 shows an example QualityIssueCategoryCatalog Message Choreography;

FIG. 555 shows an example QualityIssueCategoryCatalogueCategoryByIDQueryMessage_sync Message Data Type;

FIG. 556 shows an example QualityIssueCategoryCatalogueCategoryByIDResponseMessage_sync Message Data Type;

FIG. 557 shows an example QualityIssueCategoryCatalogueSimpleByProfileQualityIssueNotificationTypeCodeQueryMessage_sync Message Data Type;

FIG. 558 shows an example QualityIssueCategoryCatalogueSimpleByProfileQualityIssueNotificationTypeCodeResponseMessage_sync Message Data Type;

FIGS. 559-1 through 559-2 show an example QualityIssueCategoryCatalogueCategoryByIDQueryMessage_sync Element Structure;

FIGS. 560-1 through 560-2 show an example QualityIssueCategoryCatalogueCategoryByIDResponse_sync Element Structure;

FIG. 561 shows an example QualityIssueCategoryCatalogueSimpleByProfileQualityIssueNotificationTypeCodeQueryMessage_sync Element Structure;

FIG. 562 shows an example QualityIssueCategoryCatalogueSimpleByProfileQualityIssueNotificationTypeCodeResponseMessage_sync Element Structure;

FIG. 563 shows an example QualityIssueNotification Message Choreography;

FIG. 564 shows an example QualityIssueNotificationByIDQueryMessage_sync Message Data Type;

FIGS. 565-1 through 565-4 show an example QualityIssueNotificationByIDResponseMessage_sync Message Data Type;

FIG. 566 shows an example QualityIssueNotificationChangeConfirmationMessage_sync Message Data Type;

FIGS. 567-1 through 567-4 show an example QualityIssueNotificationChangeRequestMessage_sync Message Data Type;

FIG. 568 shows an example QualityIssueNotificationCreateConfirmationMessage_sync Message Data Type;

FIGS. 569-1 through 569-4 show an example QualityIssueNotificationCreateRequestMessage_sync Message Data Type;

FIG. 570 shows an example QualityIssueNotificationProductByElementsQueryMessage_sync Message Data Type;

FIGS. 571-1 through 571-2 show an example QualityIssueNotificationProductByElementsResponseMessage_sync Message Data Type;

FIG. 572 shows an example QualityIssueNotificationByIDQueryMessage_sync Element Structure;

FIGS. 573-1 through 573-37 show an example QualityIssueNotificationByIDResponseMessage_sync Element Structure;

FIG. 574 shows an example QualityIssueNotificationChangeConfirmationMessage_sync Element Structure;

FIGS. 575-1 through 575-27 show an example QualityIssueNotificationChangeRequestMessage_sync Element Structure;

FIG. 576 shows an example QualityIssueNotificationCreateConfirmationMessage_sync Element Structure;

FIGS. 577-1 through 577-24 show an example QualityIssueNotificationCreateRequestMessage_sync Element Structure;

FIGS. 578-1 through 578-3 show an example QualityIssueNotificationProductByElementsQueryMessage_sync Element Structure;

FIGS. 579-1 through 579-5 show an example QualityIssueNotificationProductByElementsResponseMessage_sync Element Structure;

FIGS. 580 through 581 show an example RepetitiveManufacturingConfirmation async Message Choreography;

FIG. 582 shows an example RepetitiveManufacturingConfirmationCancelConfirmationMessage_sync Message Data Type;

FIG. 583 shows an example RepetitiveManufacturingConfirmationCancelRequestMessage_sync Message Data Type;

FIG. 584 shows an example RepetitiveManufacturingConfirmationCreateConfirmationMessage Message Data Type;

FIG. 585 shows an example RepetitiveManufacturingConfirmationCreateConfirmationMessage_sync Message Data Type;

FIG. 586 shows an example RepetitiveManufacturingConfirmationCreateRequestMessage Message Data Type;

FIG. 587 shows an example RepetitiveManufacturingConfirmationCreateRequestMessage_sync Message Data Type;

FIG. 588 shows an example RepetitiveManufacturingConfirmationCancelConfirmationMessage_sync Element Structure;

FIG. 589 shows an example RepetitiveManufacturingConfirmationCancelRequestMessage_sync Element Structure;

FIG. 590 shows an example RepetitiveManufacturingConfirmationCreateConfirmationMessage Element Structure;

FIG. 591 shows an example RepetitiveManufacturingConfirmationCreateConfirmationMessage_sync Element Structure;

FIGS. 592-1 through 592-10 show an example RepetitiveManufacturingConfirmationCreateRequestMessage Element Structure;

FIGS. 593-1 through 593-11 show an example RepetitiveManufacturingConfirmationCreateRequestMessage_sync Element Structure;

FIG. 594 shows an example SalesOrder Message Choreography;

FIG. 595 shows an example SalesOrderBasicDataByBuyerAndBasicDataQueryMessage_sync Message Data Type;

FIG. 596 shows an example SalesOrderBasicDataByBuyerAndCreditBlockedQueryMessage_sync Message Data Type;

FIG. 597 shows an example SalesOrderBasicDataByBuyerAndDeliveryBlockedQueryMessage_sync Message Data Type;

FIG. 598 shows an example SalesOrderBasicDataByBuyerAndIncompletenessQueryMessage_sync Message Data Type;

FIG. 599 shows an example SalesOrderBasicDataByBuyerAndInvoicingBlockedQueryMessage_sync Message Data Type;

FIG. 600 shows an example SalesOrderByIDQueryMessage_sync Message Data Type;

FIG. 601 shows an example SalesOrderItemByAccountAssignmentQueryMessage_sync Message Data Type;

FIG. 602 shows an example SalesOrderItemByBuyerAndProductQueryMessage_sync Message Data Type;

FIG. 603 shows an example SalesOrderItemByIDQueryMessage_sync Message Data Type;

FIGS. 604-1 through 604-2 show an example SalesOrderBasicDataByBuyerAndBasicDataQueryMessage_sync Element Structure;

FIGS. 605-1 through 605-5 show an example SalesOrderBasicDataByBuyerAndBasicDataResponseMessage_sync Element Structure;

FIG. 606 shows an example SalesOrderBasicDataByBuyerAndCreditBlockedQueryMessage_sync Element Structure;

FIGS. 607-1 through 607-4 show an example SalesOrderBasicDataByBuyerAndCreditBlockedResponseMessage_sync Element Structure;

FIG. 608 shows an example SalesOrderBasicDataByBuyerAndDeliveryBlockedQueryMessage_sync Element Structure;

FIGS. 609-1 through 609-3 show an example SalesOrderBasicDataByBuyerAndDeliveryBlockedResponseMessage_sync Element Structure;

FIG. 610 shows an example SalesOrderBasicDataByBuyerAndIncompletenessQueryMessage_sync Element Structure;

FIGS. 611-1 through 611-5 show an example SalesOrderBasicDataByBuyerAndIncompletenessResponseMessage_sync Element Structure;

FIG. 612 shows an example SalesOrderBasicDataByBuyerAndInvoicingBlockedQueryMessage_sync Element Structure;

FIGS. 613-1 through 613-4 show an example SalesOrderBasicDataByBuyerAndInvoicingBlockedResponseMessage_sync Element Structure;

FIG. 614 shows an example SalesOrderByIDQueryMessage_sync Element Structure;

FIGS. 615-1 through 615-14 show an example SalesOrderByIDResponseMessage_sync Element Structure;

FIG. 616 shows an example SalesOrderCreateConfirmationMessage_sync Element Structure;

FIGS. 617-1 through 617-3 show an example SalesOrderCreateRequestMessage_sync Element Structure;

FIG. 618 shows an example SalesOrderItemByAccountAssignmentQueryMessage_sync Element Structure;

FIGS. 619-1 through 619-4 show an example SalesOrderItemByAccountAssignmentResponseMessage_sync Element Structure;

FIGS. 620-1 through 620-2 show an example SalesOrderItemByBuyerAndProductQueryMessage_sync Element Structure;

FIGS. 621-1 through 621-4 show an example SalesOrderItemByBuyerAndProductResponseMessage_sync Element Structure;

FIG. 622 shows an example SalesOrderItemByIDQueryMessage_sync Element Structure;

FIGS. 623-1 through 623-5 show an example SalesOrderItemByIDResponseMessage_sync Element Structure;

FIGS. 624-1 through 624-2 show an example SalesOrderItemScheduleLineChangeConfirmationMessage_sync Element Structure;

FIGS. 625-1 through 625-2 show an example SalesOrderItemScheduleLineChangeRequestMessage_sync Element Structure;

FIGS. 626-1 through 626-14 show an example SalesOrderMessage_sync Element Structure;

FIG. 627 shows an example StockTransportPlanningOrder Message Choreography;

FIG. 628 shows an example StockTransportPlanningOrderByElementsQueryMessage_sync Message Data Type;

FIG. 629 shows an example StockTransportPlanningOrderByElementsResponseMessage_sync Message Data Type;

FIG. 630 shows an example StockTransportPlanningOrderByIDQueryMessage_sync Message Data Type;

FIG. 631 shows an example StockTransportPlanningOrderByIDResponseMessage_sync Message Data Type;

FIG. 632 shows an example StockTransportPlanningOrderCancelConfirmationMessage_sync Message Data Type;

FIG. 633 shows an example StockTransportPlanningOrderCancelRequestMessage_sync Message Data Type;

FIG. 634 shows an example StockTransportPlanningOrderChangeConfirmationMessage_sync Message Data Type;

FIG. 635 shows an example StockTransportPlanningOrderChangeRequestMessage_sync Message Data Type;

FIG. 636 shows an example StockTransportPlanningOrderCreateConfirmationMessage_sync Message Data Type;

FIG. 637 shows an example StockTransportPlanningOrderCreateRequestMessage_sync Message Data Type;

FIGS. 638-1 through 638-9 show an example StockTransportPlanningOrderByElementsQueryMessage_sync Element Structure;

FIGS. 639-1 through 639-7 show an example StockTransportPlanningOrderByElementsResponseMessage_sync Element Structure;

FIGS. 640-1 through 640-5 show an example StockTransportPlanningOrderByIDQueryMessage_sync Element Structure;

FIGS. 641-1 through 641-7 show an example StockTransportPlanningOrderByIDResponseMessage_sync Element Structure;

FIGS. 642-1 through 642-3 show an example StockTransportPlanningOrderCancelConfirmationMessage_sync Element Structure;

FIGS. 643-1 through 643-4 show an example StockTransportPlanningOrderCancelRequestMessage_sync Element Structure;

FIGS. 644-1 through 644-3 show an example StockTransportPlanningOrderChangeConfirmationMessage_sync Element Structure;

FIGS. 645-1 through 645-5 show an example StockTransportPlanningOrderChangeRequestMessage_sync Element Structure;

FIGS. 646-1 through 646-2 show an example StockTransportPlanningOrderCreateConfirmationMessage_sync Element Structure;

FIGS. 647-1 through 647-6 show an example StockTransportPlanningOrderCreateRequestMessage_sync Element Structure;

FIG. 648 shows an example StrategicInvestmentBuy Message Choreography;

FIG. 649 shows an example StrategicInvestmentBuySimulateQueryMessage_sync Message Data Type;

FIG. 650 shows an example StrategicInvestmentBuySimulateResponseMessage_sync Message Data Type;

FIGS. 651-1 through 651-7 show an example StrategicInvestmentBuySimulateQuery Element Structure;

FIGS. 652-1 through 652-6 show an example StrategicInvestmentBuySimulateResponse Element Structure;

FIG. 653-1 shows an example SupplyPlanningArea A2A async Message Choreography;

FIG. 653-2 shows an example SupplyPlanningArea A2X sync Message Choreography;

FIG. 654 shows an example SupplyPlanningAreaByLocationIDAndLocationTypeCodeQueryMessage Message Data Type;

FIG. 655 shows an example SupplyPlanningAreaByLocationIDAndLocationTypeCodeResponseMessage Message Data Type;

FIG. 656 shows an example SupplyPlanningAreaByLocationIDQueryMessage_sync Message Data Type;

FIG. 657 shows an example SupplyPlanningAreaByLocationIDResponseMessage_sync Message Data Type;

FIG. 658 shows an example SupplyPlanningAreaChangeConfirmationMessage_sync Message Data Type;

FIG. 659 shows an example SupplyPlanningAreaChangeRequestMessage_sync Message Data Type;

FIG. 660 shows an example SupplyPlanningAreaCreateConfirmationMessage_sync Message Data Type;

FIG. 661 shows an example SupplyPlanningAreaCreateRequestMessage_sync Message Data Type;

FIG. 662 shows an example SupplyPlanningAreaDeactivateConfirmationMessage_sync Message Data Type;

FIG. 663 shows an example SupplyPlanningAreaDeactivateRequestMessage_sync Message Data Type;

FIGS. 664-1 through 664-3 show an example SupplyPlanningAreaByLocationIDAndLocationTypeCodeQueryMessage Element Structure;

FIGS. 665-1 through 665-2 show an example SupplyPlanningAreaByLocationIDAndLocationTypeCodeResponseMessage Element Structure;

FIG. 666 shows an example SupplyPlanningAreaByLocationIDQueryMessage_sync Element Structure;

FIGS. 667-1 through 667-3 show an example SupplyPlanningAreaByLocationIDResponseMessage_sync Element Structure;

FIG. 668 shows an example SupplyPlanningAreaChangeConfirmationMessage_sync Element Structure;

FIGS. 669-1 through 669-2 show an example SupplyPlanningAreaChangeRequestMessage_sync Element Structure;

FIG. 670 shows an example SupplyPlanningAreaCreateConfirmationMessage_sync Element Structure;

FIGS. 671-1 through 671-2 show an example SupplyPlanningAreaCreateRequestMessage_sync Element Structure;

FIG. 672 shows an example SupplyPlanningAreaDeactivateConfirmationMessage_sync Element Structure;

FIG. 673 shows an example SupplyPlanningAreaDeactivateRequestMessage_sync Element Structure;

FIG. 674-1 shows an example TradeItemCatalogue Subscription & Initial transmission process Message Choreography;

FIG. 674-2 shows an example TradeItemCatalogue Confirmation process Message Choreography;

FIG. 674-3 shows an example TradeItemCatalogue Transmission process Message Choreography; and FIG. 674-4 shows an example TradeItemCatalogue Cancellation process Message Choreography;

FIGS. 675-1 through 675-4 show example TradeItemCatalogueTemplateMessage, TradeItemCatalogueAcceptanceNotification, TradeItemCatalogueSubscriptionCancelRequest, TradeItemCatalogueSubscriptionConfirmation, TradeItemCatalogueSubscriptionRequest, TradeItemCatalogueTransmissionConfirmation, TradeItemCatalogueTransmissionRequest, and TradeItemCatalogueTransmission RequestRequest Element Structures.

DETAILED DESCRIPTION

A. Overview

Methods and systems consistent with the subject matter described herein facilitate ecommerce by providing consistent interfaces that are suitable for use across industries, across businesses, and across different departments within a business during a business transaction. To generate consistent interfaces, methods and systems consistent with the subject matter described herein utilize a business object model, which reflects the data that will be used during a given business transaction. An example of a business transaction is the exchange of purchase orders and order confirmations between a buyer and a seller. The business object model is generated in a hierarchical manner to ensure that the same type of data is represented the same way throughout the business object model. This ensures the consistency of the information in the business object model. Consistency is also reflected in the semantic meaning of the various structural elements. That is, each structural element has a consistent business meaning. For example, the location entity, regardless of in which package it is located, refers to a location.

From this business object model, various interfaces are derived to accomplish the functionality of the business transaction. Interfaces provide an entry point for components to access the functionality of an application. For example, the interface for a Purchase Order Request provides an entry point for components to access the functionality of a Purchase Order, in particular, to transmit and/or receive a Purchase Order Request. One skilled in the art will recognize that each of these interfaces may be provided, sold, distributed, utilized, or marketed as a separate product or as a major component of a separate product. Alternatively, a group of related interfaces may be provided, sold, distributed, utilized, or marketed as a product or as a major component of a separate product. Because the interfaces are generated from the business object model, the information in the interfaces is consistent, and the interfaces are consistent among the business entities. Such consistency facilitates heterogeneous business entities in cooperating to accomplish the business transaction.

Generally, the business object is a representation of a type of a uniquely identifiable business entity (an object instance) described by a structural model. In the architecture, processes may typically operate on business objects. Business objects represent a specific view on some well-defined business content. In other words, business objects represent content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component, is an object that encapsulates transactional data (i.e., data that is valid for a point in time). The term business object will be used generically to refer to a business process object and a master data object, unless the context requires otherwise. Properly implemented, business objects are implemented free of redundancies.

The architectural elements also include the process component. The process component is a software package that realizes a business process and generally exposes its functionality as services. The functionality contains business transactions. In general, the process component contains one or more semantically related business objects. Often, a particular business object belongs to no more than one process component. Interactions between process component pairs involving their respective business objects, process agents, operations, interfaces, and messages are described as process component interactions, which generally determine the interactions of a pair of process components across a deployment unit boundary. Interactions between process components within a deployment unit are typically not constrained by the architectural design and can be implemented in any convenient fashion. Process components may be modular and context-independent. In other words, process components may not be specific to any particular application and as such, may be reusable. In some implementations, the process component is the smallest (most granular) element of reuse in the architecture. An external process component is generally used to represent the external system in describing interactions with the external system; however, this should be understood to require no more of the external system than that able to produce and receive messages as required by the process component that interacts with the external system. For example, process components may include multiple operations that may provide interaction with the external system. Each operation generally belongs to one type of process component in the architecture. Operations can be synchronous or asynchronous, corresponding to synchronous or asynchronous process agents, which will be described below. The operation is often the smallest, separately-callable function, described by a set of data types used as input, output, and fault parameters serving as a signature.

The architectural elements may also include the service interface, referred to simply as the interface. The interface is a named group of operations. The interface often belongs to one process component and process component might contain multiple interfaces. In one implementation, the service interface contains only inbound or outbound operations, but not a mixture of both. One interface can contain both synchronous and asynchronous operations. Normally, operations of the same type (either inbound or outbound) which belong to the same message choreography will belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. Operation can use multiple message types for inbound, outbound, or error messages. When two process components are in different deployment units, invocation of an operation of one process component by the other process component is accomplished by the operation on the other process component sending a message to the first process component.

The architectural elements may also include the process agent. Process agents do business processing that involves the sending or receiving of messages. Each operation normally has at least one associated process agent. Each process agent can be associated with one or more operations. Process agents can be either inbound or outbound and either synchronous or asynchronous. Asynchronous outbound process agents are called after a business object changes such as after a "create", "update", or "delete" of a business object instance. Synchronous outbound process agents are generally triggered directly by business object. An outbound process agent will generally perform some processing of the data of the business object instance whose change triggered the event. The outbound agent triggers subsequent business process steps by sending messages using well-defined outbound services to another process component, which generally will be in another deployment unit, or to an external system. The outbound process agent is linked to the one business object that triggers the agent, but it is sent not to another business object but rather to another process component. Thus, the outbound process agent can be implemented without knowledge of the exact business object design of the recipient process component. Alternatively, the process agent may be inbound. For example, inbound process agents may be used for the inbound part of a message-based communication. Inbound process agents are called after a message has been received. The inbound process agent starts the execution of the business process step requested in a message by creating or updating one or multiple business object instances. Inbound process agent is not generally the agent of business object but of its process component. Inbound process agent can act on multiple business objects in a process component. Regardless of whether the process agent is inbound or outbound, an agent may be synchronous if used when a process component requires a more or less immediate response from another process component, and is waiting for that response to continue its work.

The architectural elements also include the deployment unit. Deployment unit may include one or more process components that are generally deployed together on a single computer system platform. Conversely, separate deployment units can be deployed on separate physical computing systems. The process components of one deployment unit can interact with those of another deployment unit using messages passed through one or more data communication networks or other suitable communication channels. Thus, a deployment unit deployed on a platform belonging to one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by the deployment unit to be scaled to meet demand by creating as many instances as needed.

Since interaction between deployment units is through process component operations, one deployment unit can be replaced by other another deployment unit as long as the new deployment unit supports the operations depended upon by other deployment units as appropriate. Thus, while deployment units can depend on the external interfaces of process components in other deployment units, deployment units are not dependent on process component interaction within other deployment units. Similarly, process components that interact with other process components or external systems only through messages, e.g., as sent and received by operations, can also be replaced as long as the replacement generally supports the operations of the original.

Services (or interfaces) may be provided in a flexible architecture to support varying criteria between services and systems. The flexible architecture may generally be provided by a service delivery business object. The system may be able to schedule a service asynchronously as necessary, or on a regular basis. Services may be planned according to a schedule manually or automatically. For example, a follow-up service may be scheduled automatically upon completing an initial service. In addition, flexible execution periods may be possible (e.g. hourly, daily, every three months, etc.). Each customer may plan the services on demand or reschedule service execution upon request.

FIG. 1 depicts a flow diagram 100 showing an example technique, perhaps implemented by systems similar to those disclosed herein. Initially, to generate the business object model, design engineers study the details of a business process, and model the business process using a "business scenario" (step 102). The business scenario identifies the steps performed by the different business entities during a business process. Thus, the business scenario is a complete representation of a clearly defined business process.

After creating the business scenario, the developers add details to each step of the business scenario (step 104). In particular, for each step of the business scenario, the developers identify the complete process steps performed by each business entity. A discrete portion of the business scenario reflects a "business transaction," and each business entity is referred to as a "component" of the business transaction. The developers also identify the messages that are transmitted between the components. A "process interaction model" represents the complete process steps between two components.

After creating the process interaction model, the developers create a "message choreography" (step 106), which depicts the messages transmitted between the two components in the process interaction model. The developers then represent the transmission of the messages between the components during a business process in a "business document flow" (step 108). Thus, the business document flow illustrates the flow of information between the business entities during a business process.

FIG. 2 depicts an exemplary business document flow 200 for the process of purchasing a product or service. The business entities involved with the illustrative purchase process include Accounting 202, Payment 204, Invoicing 206, Supply Chain Execution ("SCE") 208, Supply Chain Planning ("SCP") 210, Fulfillment Coordination ("FC") 212, Supply Relationship Management ("SRM") 214, Supplier 216, and Bank 218. The business document flow 200 is divided into four different transactions: Preparation of Ordering ("Contract") 220, Ordering 222, Goods Receiving ("Delivery") 224, and Billing/Payment 226. In the business document flow, arrows 228 represent the transmittal of documents. Each document reflects a message transmitted between entities. One of ordinary skill in the art will appreciate that the messages transferred may be considered to be a communications protocol. The process flow follows the focus of control, which is depicted as a solid vertical line (e.g., 229) when the step is required, and a dotted vertical line (e.g., 230) when the step is optional.

During the Contract transaction 220, the SRM 214 sends a Source of Supply Notification 232 to the SCP 210. This step is optional, as illustrated by the optional control line 230 coupling this step to the remainder of the business document flow 200. During the Ordering transaction 222, the SCP 210 sends a Purchase Requirement Request 234 to the FC 212, which forwards a Purchase Requirement Request 236 to the SRM 214. The SRM 214 then sends a Purchase Requirement Confirmation 238 to the FC 212, and the FC 212 sends a Purchase Requirement Confirmation 240 to the SCP 210. The SRM 214 also sends a Purchase Order Request 242 to the Supplier 216, and sends Purchase Order Information 244 to the FC 212. The FC 212 then sends a Purchase Order Planning Notification 246 to the SCP 210. The Supplier 216, after receiving the Purchase Order Request 242, sends a Purchase Order Confirmation 248 to the SRM 214, which sends a Purchase Order Information confirmation message 254 to the FC 212, which sends a message 256 confirming the Purchase Order Planning Notification to the SCP 210. The SRM 214 then sends an Invoice Due Notification 258 to Invoicing 206.

During the Delivery transaction 224, the FC 212 sends a Delivery Execution Request 260 to the SCE 208. The Supplier 216 could optionally (illustrated at control line 250) send a Dispatched Delivery Notification 252 to the SCE 208.

The SCE 208 then sends a message 262 to the FC 212 notifying the FC 212 that the request for the Delivery Information was created. The FC 212 then sends a message 264 notifying the SRM 214 that the request for the Delivery Information was created. The FC 212 also sends a message 266 notifying the SCP 210 that the request for the Delivery Information was created. The SCE 208 sends a message 268 to the FC 212 when the goods have been set aside for delivery. The FC 212 sends a message 270 to the SRM 214 when the goods have been set aside for delivery. The FC 212 also sends a message 272 to the SCP 210 when the goods have been set aside for delivery.

The SCE 208 sends a message 274 to the FC 212 when the goods have been delivered. The FC 212 then sends a message 276 to the SRM 214 indicating that the goods have been delivered, and sends a message 278 to the SCP 210 indicating that the goods have been delivered. The SCE 208 then sends an Inventory Change Accounting Notification 280 to Accounting 202, and an Inventory Change Notification 282 to the SCP 210. The FC 212 sends an Invoice Due Notification 284 to Invoicing 206, and SCE 208 sends a Received Delivery Notification 286 to the Supplier 216.

During the Billing/Payment transaction 226, the Supplier 216 sends an Invoice Request 287 to Invoicing 206. Invoicing 206 then sends a Payment Due Notification 288 to Payment 204, a Tax Due Notification 289 to Payment 204, an Invoice Confirmation 290 to the Supplier 216, and an Invoice Accounting Notification 291 to Accounting 202. Payment 204 sends a Payment Request 292 to the Bank 218, and a Payment Requested Accounting Notification 293 to Accounting 202. Bank 218 sends a Bank Statement Information 296 to Payment 204. Payment 204 then sends a Payment Done Information 294 to Invoicing 206 and a Payment Done Accounting Notification 295 to Accounting 202.

Within a business document flow, business documents having the same or similar structures are marked. For example, in the business document flow 200 depicted in FIG. 2, Purchase Requirement Requests 234, 236 and Purchase Requirement Confirmations 238, 240 have the same structures. Thus, each of these business documents is marked with an "O6." Similarly, Purchase Order Request 242 and Purchase Order Confirmation 248 have the same structures. Thus, both documents are marked with an "O1." Each business document or message is based on a message type. A list of various message types with their corresponding codes description is provided below.

| Name | Description |
|---|---|
| Source of Supply Notification | A SourceOfSupplyNotification is a notice to Supply Chain Planning about available sources of supply. |
| Catalogue Update Notification | A CatalogueUpdateNotification is a notice from a catalogue provider to an interested party about a new catalogue transmitted in the message or about changes to an existing catalogue transmitted in the message. |
| Catalogue Publication Request | A CataloguePublicationRequest is a request from catalogue authoring to the Catalogue Search Engine (the publishing system) to publish a new or changed catalogue or to delete an already published catalogue (the catalogue is possibly split into several transmission packages). |
| CataloguePublication TransmissionPackage Notification | A CataloguePublicationTransmissionPackageNotification is the notification of the Catalogue Search Engine (the publishing system) to Catalogue Authoring about a package of a catalogue publication transmission and information about the reception of this package and the validity of its content. |
| CataloguePublication Confirmation | A CataloguePublicationConfirmation is the confirmation of the Catalogue Search Engine (the publishing system) to Catalogue Authoring whether the publication or deletion of a catalogue requested by a CataloguePublicationRequest was successful or not. |
| CataloguePublication Transmission CancellationRequest | A CataloguePublicationTransmissionCancellationRequest is the request of Catalogue Authoring to Catalogue Search Engine (the publishing system) to cancel the transmission of a catalogue and to restore an earlier published state (if such exists) of the catalogue. Moreover, no more packages are sent for this transmission. |
| CataloguePublication TransmissionCancellation Confirmation | A CataloguePublicationTransmissionCancellationConfirmation is the confirmation of Catalogue Search Engine (the publishing system) whether the transmission of a catalogue has been cancelled successfully and an earlier published state of this catalogue (if such exists) has been restored or not. |
| CataloguePublication TransmissionItemLock Request | A CataloguePublicationTransmissionItemLockRequest is the request of Catalogue Authoring to lock single items of the catalogue contained in the catalogue publication transmission. |
| Catalogue Publication Transmission Item Lock Confirmation | A CataloguePublicationTransmissionItemLockConfirmation is the confirmation of Catalogue Search Engine (the publishing system) to Catalogue Authoring whether single items of the catalogue contained in the catalogue publication transmission could be locked or not. To lock means that if the catalogue is not yet published the items must not be published and if the catalogue is already published, the publication of these items must be revoked. |

-continued

| Name | Description |
| --- | --- |
| Purchase Order Request | A PurchaseOrderRequest is a request from a purchaser to a seller to deliver goods or provide services. |
| Purchase Order Change Request | A PurchaseOrderChangeRequest is a change to a purchaser's request to the seller to deliver goods or provide services. |
| Purchase Order Cancellation Request | A PurchaseOrderCancellationRequest is the cancellation of a purchaser's request to the seller to deliver goods or provide services. |
| Purchase Order Confirmation | A PurchaseOrderConfirmation is a confirmation, partial confirmation, or change from a seller to the purchaser, regarding the requested delivery of goods or provision of services. |
| Purchase Order Information | A PurchaseOrderInformation is information from a purchasing system for interested recipients about the current state of a purchase order when creating or changing a purchase order, confirming a purchase order or canceling a purchase order. |
| Purchase Order Planning Notification | A PurchaseOrderPlanningNotification is a message by means of which planning applications are notified about those aspects of a purchase order that are relevant for planning. |
| Purchase Requirement Request | A PurchaseRequirementRequest is a request from a requestor to a purchaser to (externally) procure products (materials, services) (external procurement). |
| Purchase Order Requirement Confirmation | A PurchaseRequirementConfirmation is a notice from the purchaser to the requestor about the degree of fulfillment of a requirement. |
| Product Demand Influencing Event Notification | A ProductDemandInfluencingEventNotification is a notification about an event which influences the supply or demand of products. |
| Product Forecast Notification | A ProductForecastNotification is a notification about future product demands (forecasts). |
| Product Forecast Revision Notification | A ProductForecastRevisionNotification is a notification about the revision of future product demands (forecasts). |
| Product Activity Notification | A ProductActivityNotification is a message which communicates product-related activities of a buyer to a vendor. Based on this, the vendor can perform supply planning for the buyer. |
| RFQ Request | An RFQRequest is the request from a purchaser to a bidder to participate in a request for quotation for a product. |
| RFQ Change Request | An RFQChangeRequest is a change to the purchaser's request for a bidder to participate in the request for quotation for a product. |
| RFQ Cancellation Request | An RFQCancellationRequest is a cancellation by the purchaser of a request for quotation for a product. |
| RFQ Result Notification | An RFQResultNotification is a notification by a purchaser to a bidder about the type and extent of the acceptance of a quote or about the rejection of the quote. |
| Quote Notification | A QuoteNotification is the quote of a bidder communicated to a purchaser concerning the request for quotation for a product by the purchaser. |
| Sales Order Fulfillment Request | A SalesOrderFulfillmentRequest is a request (or change or cancellation of such a request) from a selling component to a procuring component, to fulfill the logistical requirements (e.g., available-to-promise check, scheduling, requirements planning, procurement, and delivery) of a sales order. |
| Sales Order Fulfillment Confirmation | A SalesOrderFulfillmentConfirmation is a confirmation, partial confirmation or change from the procuring component to the selling component, regarding a sales order with respect to which procurement has been requested. |
| Order ID Assignment Notification | An OrderIDAssignmentNotification is a message that allows a buyer to assign a vendor order numbers for identifying "purchase orders generated by the vendor." |
| Delivery Execution Request | A DeliveryExecutionRequest is a request to a warehouse or supply chain execution to prepare and execute the outbound delivery of goods or the acceptance of an expected or announced inbound delivery. |
| Delivery Information | A DeliveryInformation is a message about the creation, change, and execution status of a delivery. |
| Despatched Delivery Notification | A DespatchedDeliveryNotification is a notification communicated to a product recipient about the planned arrival, pickup, or issue date of a ready-to-send delivery, including details about the content of the delivery. |
| Received Delivery Notification | A ReceivedDeliveryNotification is a notification communicated to a vendor about the arrival of the delivery sent by him to the product recipient, including details about the content of the delivery. |

-continued

| Name | Description |
|---|---|
| Delivery Schedule Notification | A DeliveryScheduleNotification is a message that is sent from a buyer to a vendor to notify the latter about the quantity of a product to be delivered with a certain liability at a certain date in accordance with a given scheduling agreement between buyer and vendor. |
| Vendor Generated Order Notification | A VendorGeneratedOrderNotification is a message that is used by a vendor/seller to transfer the replenishment order that he has initiated and planned to a customer/buyer so that the latter can create a purchase order. The notification sent by the vendor/seller to the customer/buyer regarding the planned replenishment order can be regarded as a "purchase order generated by the seller." |
| Vendor Generated Order Confirmation | VendorGeneratedOrderConfirmation is the confirmation from a customer/buyer that a purchase order has been created for the replenishment order initiated and planned by his vendor/seller. This confirmation from the customer/buyer for a "purchase order generated by the seller" can be regarded as a "purchase order" in the traditional sense, which, in turn, triggers the corresponding fulfillment process at the vendor/seller. |
| Replenishment Order Notification. | A ReplenishmentOrderNotification is a message that is used by Logistics Planning (SCP, vendor) to transfer a replenishment order planned for a customer/buyer to Logistics Execution (SCE, vendor) in order to trigger further processing for the order and prepare the outbound delivery. |
| Replenishment Order Confirmation | A ReplenishmentOrderConfirmation is a message that is used by Logistics Execution (SCE, vendor) to confirm to Logistics Planning (SCP, vendor) that a replenishment order that is planned for a customer/buyer can be fulfilled. |
| Service Acknowledgement Request | A ServiceAcknowledgementRequest is a request by a seller to a purchaser to confirm the services recorded. |
| Service Acknowledgement Confirmation | A ServiceAcknowledgementConfirmation is a confirmation (or rejection) of the services recorded. |
| Inventory Change Notification | An InventoryChangeNotification is a summery of detailed information about inventory changes in inventory management, which is required for logistics planning. |
| Inventory Change Accounting Notification | An InventoryChangeAccountingNotification is a summary of aggregated information about inventory changes in inventory management, which is required for financials. |
| Inventory Change Accounting Cancellation Request | An InventoryChangeAccountingCancellationRequest is a request for the full cancellation of posting information previously sent to financials with respect to a goods movement. |
| Billing Due Notification | A BillingDueNotification is a notification about billing-relevant data communicated to an application in which the subsequent operative processing of billing takes place. |
| Invoicing Due Notification | An InvoicingDueNotification is a notification about invoicing-relevant data communicated to an application in which the operative verification and creation of invoices takes place, and/or in which "self billing" invoices (evaluated receipt settlement) are created. |
| Invoice Request | An InvoiceRequest is a legally binding notice about accounts receivable or accounts payable for delivered goods or provided services - typically a request that payment be made for these goods or services. |
| Invoice Confirmation | An InvoiceConfirmation is the response of a recipient of an invoice to the bill-from-party by which the invoice as a whole is confirmed, rejected, or classified as "not yet decided." |
| Invoice Issued Information | An InvoiceIssuedInformation is information about provided services, delivered products, or credit or debit memo request items that have been billed, the items of an invoice that have been used for this, and the extent to which they have been billed. |
| Invoice Accounting Notification | An InvoiceAccountingNotification is a notification to financials about information on incoming or outgoing invoices from invoice verification or billing. |
| Invoice Accounting Cancellation Request | An InvoiceAccountingCancellationRequest is a request for the full cancellation of posting information previously sent to financials, regarding an incoming or outgoing invoice or credit memo. |
| Tax Due Notification | A TaxDueNotification communicates data from tax determination and calculation relevant for tax reports and tax payments to the tax register of a company. |

-continued

| Name | Description |
| --- | --- |
| Payment Due Notification | A PaymentDueNotification notifies an application (Payment), in which subsequent operative processing of payments take place, about due dates (accounts receivable and accounts payable) of business partners. |
| Credit Agency Report Query | A CreditAgencyReportQuery is an inquiry to a credit agency concerning the credit report for a business partner. |
| Credit Agency Report Response | A CreditAgencyReportResponse is a response from a credit agency concerning the inquiry about the credit report for a business partner. |
| Credit Worthiness Query | A CreditWorthinessQuery is an inquiry to credit management concerning the credit worthiness of a business partner. |
| Credit Worthiness Response | A CreditWorthinessResponse is a response from credit management concerning the inquiry about the credit worthiness of a business partner. |
| Credit Worthiness Change Information | A CreditWorthinessChangeInformation is information about changes of the credit worthiness of a business partner. |
| Credit Commitment Query | A CreditCommitmentQuery is an inquiry from credit management concerning existing payment obligations of a business partner. |
| Credit Commitment Response | A CreditCommitmentResponse is a response concerning an inquiry from credit management about existing payment obligations of a business partner. |
| Credit Commitment Record Notification | A CreditCommitmentRecordNotification is a notice to credit management about existing payment obligations of business partners. |
| Credit Worthiness Critical Parties Query | A CreditWorthinessCriticalPartiesQuery is an inquiry to credit management about business partners, for which the credit worthiness has been rated as critical. |
| Credit Worthiness Critical Parties Response | A CreditWorthinessCriticalPartiesResponse is a response from credit management concerning an inquiry about business partners, for which the credit worthiness has been rated as critical. |
| Credit Payment Record Notification | A CreditPaymentRecordNotification is a notice to credit management about the payment behavior of business partners. |
| Personnel Time Sheet Information | A PersonnelTimeSheetInformation communicates recorded personnel times and personnel time events from an upstream personnel time recording system to personnel time management. |

From the business document flow, the developers identify the business documents having identical or similar structures, and use these business documents to create the business object model (step 110). The business object model includes the objects contained within the business documents. These objects are reflected as packages containing related information, and are arranged in a hierarchical structure within the business object model, as discussed below.

Methods and systems consistent with the subject matter described herein then generate interfaces from the business object model (step 112). The heterogeneous programs use instantiations of these interfaces (called "business document objects" below) to create messages (step 114), which are sent to complete the business transaction (step 116). Business entities use these messages to exchange information with other business entities during an end-to-end business transaction. Since the business object model is shared by heterogeneous programs, the interfaces are consistent among these programs. The heterogeneous programs use these consistent interfaces to communicate in a consistent manner, thus facilitating the business transactions.

Standardized Business-to-Business ("B2B") messages are compliant with at least one of the e-business standards (i.e., they include the business-relevant fields of the standard). The e-business standards include, for example, RosettaNet for the high-tech industry, Chemical Industry Data Exchange ("CIDX"), Petroleum Industry Data Exchange ("PIDX") for the oil industry, UCCnet for trade, PapiNet for the paper industry, Odette for the automotive industry, HR-XML for human resources, and XML Common Business Library ("xCBL"). Thus, B2B messages enable simple integration of components in heterogeneous system landscapes. Application-to-Application ("A2A") messages often exceed the standards and thus may provide the benefit of the full functionality of application components. Although various steps of FIG. 1 were described as being performed manually, one skilled in the art will appreciate that such steps could be computer-assisted or performed entirely by a computer, including being performed by either hardware, software, or any other combination thereof.

B. Implementation Details

As discussed above, methods and systems consistent with the subject matter described herein create consistent interfaces by generating the interfaces from a business object model. Details regarding the creation of the business object model, the generation of an interface from the business object model, and the use of an interface generated from the business object model are provided below.

Turning to the illustrated embodiment in FIG. 3, system 300 includes or is communicably coupled (such as via a one-, bi- or multi-directional link or network) with server 302, one or more clients 304, one or more or vendors 306, one or more customers 308, at least some of which communicate across network 312. But, of course, this illustration is for example purposes only, and any distributed system or environment implementing one or more of the techniques described herein may be within the scope of this disclosure. Server 302 comprises an electronic computing device operable to receive, transmit, process and store data associated with system 300. Generally, FIG. 3 provides merely one example of computers that may be used with the disclosure. Each computer is generally intended to encompass any suitable processing device. For example, although FIG. 3 illustrates one server 302 that may be used with the disclosure, system 300 can be implemented using computers other than servers, as well as a server pool. Indeed, server 302 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 302 may be adapted to execute any operating system including Linux, UNIX, Windows Server, or any other suitable operating system. According to one embodiment, server 302 may also include or be communicably coupled with a web server and/or a mail server.

As illustrated (but not required), the server 302 is communicably coupled with a relatively remote repository 335 over a portion of the network 312. The repository 335 is any electronic storage facility, data processing center, or archive that may supplement or replace local memory (such as 327). The repository 335 may be a central database communicably coupled with the one or more servers 302 and the clients 304 via a virtual private network (VPN), SSH (Secure Shell) tunnel, or other secure network connection. The repository 335 may be physically or logically located at any appropriate location including in one of the example enterprises or off-shore, so long as it remains operable to store information associated with the system 300 and communicate such data to the server 302 or at least a subset of plurality of the clients 304.

Illustrated server 302 includes local memory 327. Memory 327 may include any memory or database module and may take the form of volatile or non-volatile memory including, without limitation, magnetic media, optical media, random access memory (RAM), read-only memory (ROM), removable media, or any other suitable local or remote memory component. Illustrated memory 327 includes an exchange infrastructure ("XI") 314, which is an infrastructure that supports the technical interaction of business processes across heterogeneous system environments. XI 314 centralizes the communication between components within a business entity and between different business entities. When appropriate, XI 314 carries out the mapping between the messages. XI 314 integrates different versions of systems implemented on different platforms (e.g., Java® and ABAP). XI 314 is based on an open architecture, and makes use of open standards, such as eXtensible Markup Language (XML)™ and Java® environments. XI 314 offers services that are useful in a heterogeneous and complex system landscape. In particular, XI 314 offers a runtime infrastructure for message exchange, configuration options for managing business processes and message flow, and options for transforming message contents between sender and receiver systems.

XI 314 stores data types 316, a business object model 318, and interfaces 320. The details regarding the business object model are described below. Data types 316 are the building blocks for the business object model 318. The business object model 318 is used to derive consistent interfaces 320. XI 314 allows for the exchange of information from a first company having one computer system to a second company having a second computer system over network 312 by using the standardized interfaces 320.

While not illustrated, memory 327 may also include business objects and any other appropriate data such as services, interfaces, VPN applications or services, firewall policies, a security or access log, print or other reporting files, HTML files or templates, data classes or object interfaces, child software applications or sub-systems, and others. This stored data may be stored in one or more logical or physical repositories. In some embodiments, the stored data (or pointers thereto) may be stored in one or more tables in a relational database described in terms of SQL statements or scripts. In the same or other embodiments, the stored data may also be formatted, stored, or defined as various data structures in text files, XML documents, Virtual Storage Access Method (VSAM) files, flat files, Btrieve files, comma-separated-value (CSV) files, internal variables, or one or more libraries. For example, a particular data service record may merely be a pointer to a particular piece of third party software stored remotely. In another example, a particular data service may be an internally stored software object usable by authenticated customers or internal development. In short, the stored data may comprise one table or file or a plurality of tables or files stored on one computer or across a plurality of computers in any appropriate format. Indeed, some or all of the stored data may be local or remote without departing from the scope of this disclosure and store any type of appropriate data.

Server 302 also includes processor 325. Processor 325 executes instructions and manipulates data to perform the operations of server 302 such as, for example, a central processing unit (CPU), a blade, an application specific integrated circuit (ASIC), or a field-programmable gate array (FPGA). Although FIG. 3 illustrates a single processor 325 in server 302, multiple processors 325 may be used according to particular needs and reference to processor 325 is meant to include multiple processors 325 where applicable. In the illustrated embodiment, processor 325 executes at least business application 330.

At a high level, business application 330 is any application, program, module, process, or other software that utilizes or facilitates the exchange of information via messages (or services) or the use of business objects. For example, application 130 may implement, utilize or otherwise leverage an enterprise service-oriented architecture (enterprise SOA), which may be considered a blueprint for an adaptable, flexible, and open IT architecture for developing services-based, enterprise-scale business solutions. This example enterprise service may be a series of web services combined with business logic that can be accessed and used repeatedly to support a particular business process. Aggregating web services into business-level enterprise services helps provide a more meaningful foundation for the task of automating enterprise-scale business scenarios Put simply, enterprise services help provide a holistic combination of actions that are semantically linked to complete the specific task, no matter how many cross-applications are involved. In certain cases, system 300 may implement a composite application 330, as described below in FIG. 4. Regardless of the particular implementation, "software" may include software, firmware, wired or programmed hardware, or any combination thereof as appropriate. Indeed, application 330 may be written or described in any appropriate computer language including C, C++, Java, Visual Basic, assembler, Perl, any suitable version of 4GL, as well as others. For example, returning to the above mentioned composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 330 is illustrated in FIG. 4 as including various sub-modules, application 330 may include numerous other sub-modules or may instead be a single multi-tasked module that implements the various features and functionality through various objects, methods, or other processes. Further, while illustrated as internal to server 302, one or more processes associated with application 330 may be stored, referenced, or executed remotely. For example, a portion of application 330 may be a web service that is remotely called, while another portion of application 330 may be an interface object bundled for processing at remote client 304. Moreover, application 330 may be a child or sub-module of another software module or enterprise application (not illustrated) without departing from the scope of this disclosure. Indeed, application 330 may be a hosted solution that allows multiple related or third parties in different portions of the process to perform the respective processing.

More specifically, as illustrated in FIG. 4, application 330 may be a composite application, or an application built on other applications, that includes an object access layer (OAL) and a service layer. In this example, application 330 may execute or provide a number of application services, such as customer relationship management (CRM) systems, human resources management (HRM) systems, financial management (FM) systems, project management (PM) systems, knowledge management (KM) systems, and electronic file and mail systems. Such an object access layer is operable to exchange data with a plurality of enterprise base systems and to present the data to a composite application through a uniform interface. The example service layer is operable to provide services to the composite application. These layers may help the composite application to orchestrate a business process in synchronization with other existing processes (e.g., native processes of enterprise base systems) and leverage existing investments in the IT platform. Further, composite application 330 may run on a heterogeneous IT platform. In doing so, composite application may be cross-functional in that it may drive business processes across different applications, technologies, and organizations. Accordingly, composite application 330 may drive end-to-end business processes across heterogeneous systems or sub-systems. Application 330 may also include or be coupled with a persistence layer and one or more application system connectors. Such application system connectors enable data exchange and integration with enterprise sub-systems and may include an Enterprise Connector (EC) interface, an Internet Communication Manager/Internet Communication Framework (ICM/ICF) interface, an Encapsulated PostScript (EPS) interface, and/or other interfaces that provide Remote Function Call (RFC) capability. It will be understood that while this example describes a composite application 330, it may instead be a standalone or (relatively) simple software program. Regardless, application 330 may also perform processing automatically, which may indicate that the appropriate processing is substantially performed by at least one component of system 300. It should be understood that automatically further contemplates any suitable administrator or other user interaction with application 330 or other components of system 300 without departing from the scope of this disclosure.

Returning to FIG. 3, illustrated server 302 may also include interface 317 for communicating with other computer systems, such as clients 304, over network 312 in a client-server or other distributed environment. In certain embodiments, server 302 receives data from internal or external senders through interface 317 for storage in memory 327, for storage in DB 335, and/or processing by processor 325. Generally, interface 317 comprises logic encoded in software and/or hardware in a suitable combination and operable to communicate with network 312. More specifically, interface 317 may comprise software supporting one or more communications protocols associated with communications network 312 or hardware operable to communicate physical signals.

Network 312 facilitates wireless or wireline communication between computer server 302 and any other local or remote computer, such as clients 304. Network 312 may be all or a portion of an enterprise or secured network. In another example, network 312 may be a VPN merely between server 302 and client 304 across wireline or wireless link. Such an example wireless link may be via 802.11a, 802.11b, 802.11g, 802.20, WiMax, and many others. While illustrated as a single or continuous network, network 312 may be logically divided into various sub-nets or virtual networks without departing from the scope of this disclosure, so long as at least portion of network 312 may facilitate communications between server 302 and at least one client 304. For example, server 302 may be communicably coupled to one or more "local" repositories through one sub-net while communicably coupled to a particular client 304 or "remote" repositories through another. In other words, network 312 encompasses any internal or external network, networks, subnetwork, or combination thereof operable to facilitate communications between various computing components in system 300. Network 312 may communicate, for example, Internet Protocol (IP) packets, Frame Relay frames, Asynchronous Transfer Mode (ATM) cells, voice, video, data, and other suitable information between network addresses. Network 312 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 312 may be a secure network associated with the enterprise and certain local or remote vendors 306 and customers 308. As used in this disclosure, customer 308 is any person, department, organization, small business, enterprise, or any other entity that may use or request others to use system 300. As described above, vendors 306 also may be local or remote to customer 308. Indeed, a particular vendor 306 may provide some content to business application 330, while receiving or purchasing other content (at the same or different times) as customer 308. As illustrated, customer 308 and vendor 306 each typically perform some processing (such as uploading or purchasing content) using a computer, such as client 304.

Client 304 is any computing device operable to connect or communicate with server 302 or network 312 using any communication link. For example, client 304 is intended to encompass a personal computer, touch screen terminal, workstation, network computer, kiosk, wireless data port, smart phone, personal data assistant (PDA), one or more processors within these or other devices, or any other suitable processing device used by or for the benefit of business 308, vendor 306, or some other user or entity. At a high level, each client 304 includes or executes at least GUI 336 and comprises an electronic computing device operable to receive, transmit, process and store any appropriate data associated with system 300. It will be understood that there may be any number of clients 304 communicably coupled to server 302. Further, "client 304," "business," "business analyst," "end user," and "user" may be used interchangeably as appropriate without departing from the scope of this disclosure. Moreover, for ease of illustration, each client 304 is described in terms of being used by one user. But this disclosure contemplates that many users may use one computer or that one user may use multiple computers. For example, client 304 may be a PDA operable to wirelessly connect with external or unsecured network. In another example, client 304 may comprise a laptop that includes an input device, such as a keypad, touch screen, mouse, or other device that can accept information, and an output device that conveys information associated with the operation of server 302 or clients 304, including digital data, visual information, or GUI 336. Both the input device and output device may include fixed or removable storage media such as a magnetic computer disk, CD-ROM, or other suitable media to both receive input from and provide output to users of clients 304 through the display, namely the client portion of GUI or application interface 336.

GUI 336 comprises a graphical user interface operable to allow the user of client 304 to interface with at least a portion of system 300 for any suitable purpose, such as viewing application or other transaction data. Generally, GUI 336 provides the particular user with an efficient and user-friendly presentation of data provided by or communicated within system 300. For example, GUI 336 may present the user with the components and information that is relevant to their task, increase reuse of such components, and facilitate a sizable developer community around those components. GUI 336 may comprise a plurality of customizable frames or views having interactive fields, pull-down lists, and buttons operated by the user. For example, GUI 336 is operable to display data involving business objects and interfaces in a user-friendly form based on the user context and the displayed data. In another example, GUI 336 is operable to display different levels and types of information involving business objects and interfaces based on the identified or supplied user role. GUI 336 may also present a plurality of portals or dashboards. For example, GUI 336 may display a portal that allows users to view, create, and manage historical and real-time reports including role-based reporting and such. Of course, such reports may be in any appropriate output format including PDF, HTML, and printable text. Real-time dashboards often provide table and graph information on the current state of the data, which may be supplemented by business objects and interfaces. It should be understood that the term graphical user interface may be used in the singular or in the plural to describe one or more graphical user interfaces and each of the displays of a particular graphical user interface. Indeed, reference to GUI 336 may indicate a reference to the front-end or a component of business application 330, as well as the particular interface accessible via client 304, as appropriate, without departing from the scope of this disclosure. Therefore, GUI 336 contemplates any graphical user interface, such as a generic web browser or touchscreen, that processes information in system 300 and efficiently presents the results to the user. Server 302 can accept data from client 304 via the web browser (e.g., Microsoft Internet Explorer or Netscape Navigator) and return the appropriate HTML or XML responses to the browser using network 312.

Figure 5A:
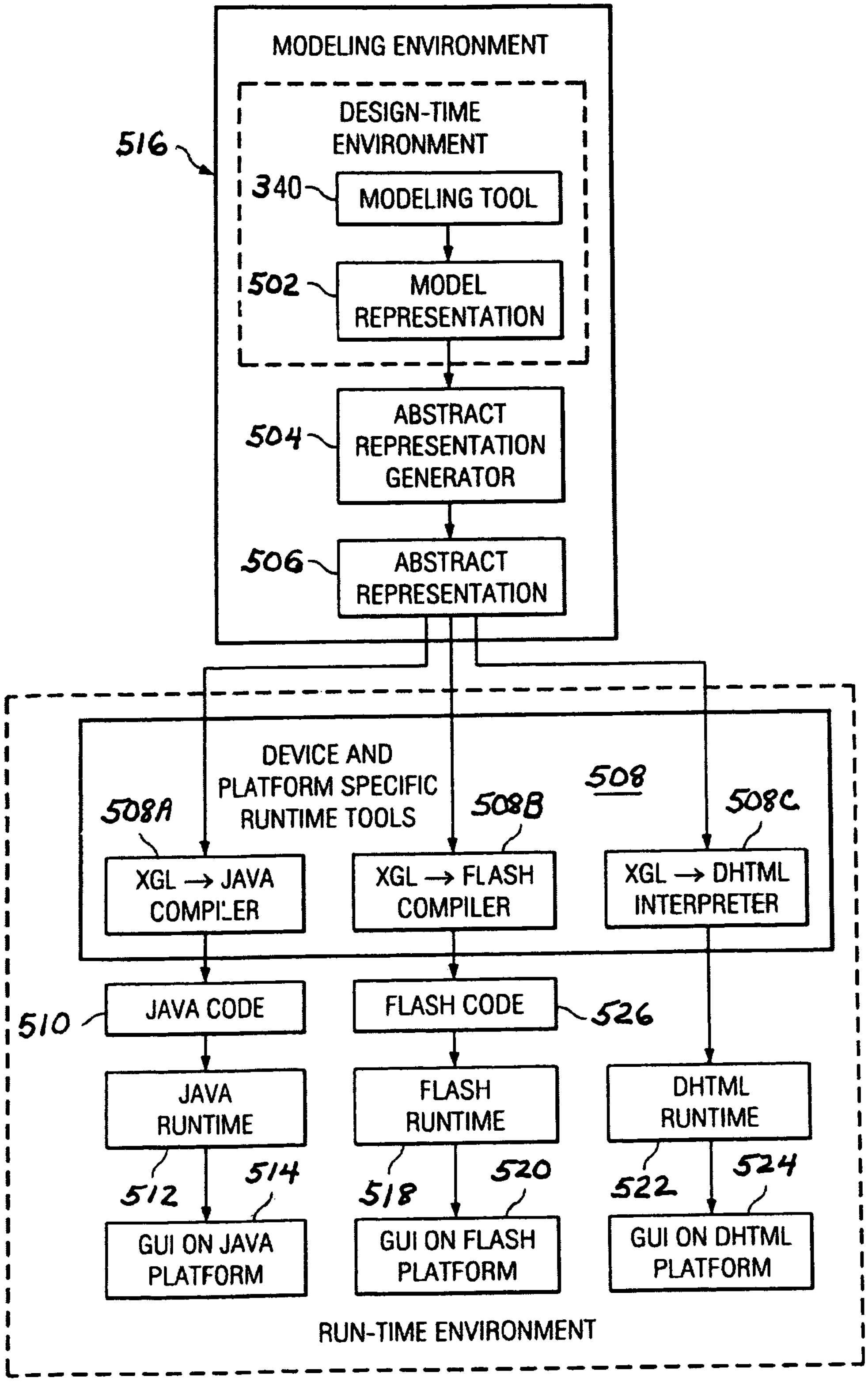
FIG. 5A depicts an example development environment in accordance with one embodiment of FIG. 1.

Various components of the present disclosure may be modeled using a model-driven environment. For example, the model-driven framework or environment may allow the developer to use simple drag-and-drop techniques to develop pattern-based or freestyle user interfaces and define the flow of data between them. The result could be an efficient, customized, visually rich online experience. In some cases, this model-driven development may accelerate the application development process and foster business-user self-service. It further enables business analysts or IT developers to compose visually rich applications that use analytic services, enterprise services, remote function calls (RFCs), APIs, and stored procedures. In addition, it may allow them to reuse existing applications and create content using a modeling process and a visual user interface instead of manual coding. FIG. 5A depicts an example modeling environment 516, namely a modeling environment, in accordance with one embodiment of the present disclosure. Thus, as illustrated in FIG. 5A, such a modeling environment 516 may implement techniques for decoupling models created during design-time from the runtime environment. In other words, model representations for GUIs created in a design time environment are decoupled from the runtime environment in which the GUIs are executed. Often in these environments, a declarative and executable representation for GUIs for applications is provided that is independent of any particular runtime platform, GUI framework, device, or programming language.

According to some embodiments, a modeler (or other analyst) may use the model-driven modeling environment 516 to create pattern-based or freestyle user interfaces using simple drag-and-drop services. Because this development may be model-driven, the modeler can typically compose an application using models of business objects without having to write much, if any, code. In some cases, this example modeling environment 516 may provide a personalized, secure interface that helps unify enterprise applications, information, and processes into a coherent, role-based portal experience. Further, the modeling environment 516 may allow the developer to access and share information and applications in a collaborative environment. In this way, virtual collaboration rooms allow developers to work together efficiently, regardless of where they are located, and may enable powerful and immediate communication that crosses organizational boundaries while enforcing security requirements. Indeed, the modeling environment 516 may provide a shared set of services for finding, organizing, and accessing unstructured content stored in third-party repositories and content management systems across various networks 312. Classification tools may automate the organization of information, while subject-matter experts and content managers can publish information to distinct user audiences. Regardless of the particular implementation or architecture, this modeling environment 516 may allow the developer to easily model hosted business objects 140 using this model-driven approach.

In certain embodiments, the modeling environment 516 may implement or utilize a generic, declarative, and executable GUI language (generally described as XGL). This example XGL is generally independent of any particular GUI framework or runtime platform. Further, XGL is normally not dependent on characteristics of a target device on which the graphic user interface is to be displayed and may also be independent of any programming language. XGL is used to generate a generic representation (occasionally referred to as the XGL representation or XGL-compliant representation) for a design-time model representation. The XGL representation is thus typically a device-independent representation of a GUI. The XGL representation is declarative in that the representation does not depend on any particular GUI framework, runtime platform, device, or programming language. The XGL representation can be executable and therefore can unambiguously encapsulate execution semantics for the GUI described by a model representation. In short, models of different types can be transformed to XGL representations.

The XGL representation may be used for generating representations of various different GUIs and supports various GUI features including full windowing and componentization support, rich data visualizations and animations, rich modes of data entry and user interactions, and flexible connectivity to any complex application data services. While a specific embodiment of XGL is discussed, various other types of XGLs may also be used in alternative embodiments. In other words, it will be understood that XGL is used for example description only and may be read to include any abstract or modeling language that can be generic, declarative, and executable.

Turning to the illustrated embodiment in FIG. 5A, modeling tool 340 may be used by a GUI designer or business analyst during the application design phase to create a model representation 502 for a GUI application. It will be understood that modeling environment 516 may include or be compatible with various different modeling tools 340 used to generate model representation 502. This model representation 502 may be a machine-readable representation of an application or a domain specific model. Model representation 502 generally encapsulates various design parameters related to the GUI such as GUI components, dependencies between the GUI components, inputs and outputs, and the like. Put another way, model representation 502 provides a form in which the one or more models can be persisted and transported, and possibly handled by various tools such as code generators, runtime interpreters, analysis and validation tools, merge tools, and the like. In one embodiment, model representation 502 maybe a collection of XML documents with a well-formed syntax.

Illustrated modeling environment 516 also includes an abstract representation generator (or XGL generator) 504 operable to generate an abstract representation (for example, XGL representation or XGL-compliant representation) 506 based upon model representation 502. Abstract representation generator 504 takes model representation 502 as input and outputs abstract representation 506 for the model representation. Model representation 502 may include multiple instances of various forms or types depending on the tool/language used for the modeling. In certain cases, these various different model representations may each be mapped to one or more abstract representations 506. Different types of model representations may be transformed or mapped to XGL representations. For each type of model representation, mapping rules may be provided for mapping the model representation to the XGL representation 506. Different mapping rules may be provided for mapping a model representation to an XGL representation.

This XGL representation 506 that is created from a model representation may then be used for processing in the runtime environment. For example, the XGL representation 506 may be used to generate a machine-executable runtime GUI (or some other runtime representation) that may be executed by a target device. As part of the runtime processing, the XGL representation 506 may be transformed into one or more runtime representations, which may indicate source code in a particular programming language, machine-executable code for a specific runtime environment, executable GUI, and so forth, which may be generated for specific runtime environments and devices. Since the XGL representation 506, rather than the design-time model representation, is used by the runtime environment, the design-time model representation is decoupled from the runtime environment. The XGL representation 506 can thus serve as the common ground or interface between design-time user interface modeling tools and a plurality of user interface runtime frameworks. It provides a self-contained, closed, and deterministic definition of all aspects of a graphical user interface in a device-independent and programming-language independent manner. Accordingly, abstract representation 506 generated for a model representation 502 is generally declarative and executable in that it provides a representation of the GUI of model representation 502 that is not dependent on any device or runtime platform, is not dependent on any programming language, and unambiguously encapsulates execution semantics for the GUI. The execution semantics may include, for example, identification of various components of the GUI, interpretation of connections between the various GUI components, information identifying the order of sequencing of events, rules governing dynamic behavior of the GUI, rules governing handling of values by the GUI, and the like. The abstract representation 506 is also not GUI runtime-platform specific. The abstract representation 506 provides a self-contained, closed, and deterministic definition of all aspects of a graphical user interface that is device independent and language independent.

Abstract representation 506 is such that the appearance and execution semantics of a GUI generated from the XGL representation work consistently on different target devices irrespective of the GUI capabilities of the target device and the target device platform. For example, the same XGL representation may be mapped to appropriate GUIs on devices of differing levels of GUI complexity (i.e., the same abstract representation may be used to generate a GUI for devices that support simple GUIs and for devices that can support complex GUIs), the GUI generated by the devices are consistent with each other in their appearance and behavior.

Abstract representation generator 504 may be configured to generate abstract representation 506 for models of different types, which may be created using different modeling tools 340. It will be understood that modeling environment 516 may include some, none, or other sub-modules or components as those shown in this example illustration. In other words, modeling environment 516 encompasses the design-time environment (with or without the abstract generator or the various representations), a modeling toolkit (such as 340) linked with a developer's space, or any other appropriate software operable to decouple models created during design-time from the runtime environment. Abstract representation 506 provides an interface between the design time environment and the runtime environment. As shown, this abstract representation 506 may then be used by runtime processing.

As part of runtime processing, modeling environment 516 may include various runtime tools 508 and may generate different types of runtime representations based upon the abstract representation 506. Examples of runtime representations include device or language-dependent (or specific) source code, runtime platform-specific machine-readable code, GUIs for a particular target device, and the like. The runtime tools 508 may include compilers, interpreters, source code generators, and other such tools that are configured to generate runtime platform-specific or target device-specific runtime representations of abstract representation 506. The runtime tool 508 may generate the runtime representation from abstract representation 506 using specific rules that map abstract representation 506 to a particular type of runtime representation. These mapping rules may be dependent on the type of runtime tool, characteristics of the target device to be used for displaying the GUI, runtime platform, and/or other factors. Accordingly, mapping rules may be provided for transforming the abstract representation 506 to any number of target runtime representations directed to one or more target GUI runtime platforms. For example, XGL-compliant code generators may conform to semantics of XGL, as described below. XGL-compliant code generators may ensure that the appearance and behavior of the generated user interfaces is preserved across a plurality of target GUI frameworks, while accommodating the differences in the intrinsic characteristics of each and also accommodating the different levels of capability of target devices.

For example, as depicted in example FIG. 5A, an XGL-to-Java compiler 508*a* may take abstract representation 506 as input and generate Java code 510 for execution by a target device comprising a Java runtime 512. Java runtime 512 may execute Java code 510 to generate or display a GUI 514 on a Java-platform target device. As another example, an XGL-to-Flash compiler 508*b* may take abstract representation 506 as input and generate Flash code 526 for execution by a target device comprising a Flash runtime 518. Flash runtime 518 may execute Flash code 516 to generate or display a GUI 520 on a target device comprising a Flash platform. As another example, an XGL-to-DHTML (dynamic HTML) interpreter 508*c* may take abstract representation 506 as input and generate DHTML statements (instructions) on the fly which are then interpreted by a DHTML runtime 522 to generate or display a GUI 524 on a target device comprising a DHTML platform.

It should be apparent that abstract representation 506 may be used to generate GUIs for Extensible Application Markup Language (XAML) or various other runtime platforms and devices. The same abstract representation 506 may be mapped to various runtime representations and device-specific and runtime platform-specific GUIs. In general, in the runtime environment, machine executable instructions specific to a runtime environment may be generated based upon the abstract representation 506 and executed to generate a GUI in the runtime environment. The same XGL representation may be used to generate machine executable instructions specific to different runtime environments and target devices.

According to certain embodiments, the process of mapping a model representation 502 to an abstract representation 506 and mapping an abstract representation 506 to some runtime representation may be automated. For example, design tools may automatically generate an abstract representation for the model representation using XGL and then use the XGL abstract representation to generate GUIs that are customized for specific runtime environments and devices. As previously indicated, mapping rules may be provided for mapping model representations to an XGL representation. Mapping rules may also be provided for mapping an XGL representation to a runtime platform-specific representation.

Since the runtime environment uses abstract representation 506 rather than model representation 502 for runtime processing, the model representation 502 that is created during design-time is decoupled from the runtime environment. Abstract representation 506 thus provides an interface between the modeling environment and the runtime environment. As a result, changes may be made to the design time environment, including changes to model representation 502 or changes that affect model representation 502, generally to not substantially affect or impact the runtime environment or tools used by the runtime environment. Likewise, changes may be made to the runtime environment generally to not substantially affect or impact the design time environment. A designer or other developer can thus concentrate on the design aspects and make changes to the design without having to worry about the runtime dependencies such as the target device platform or programming language dependencies.

Figure 5B:
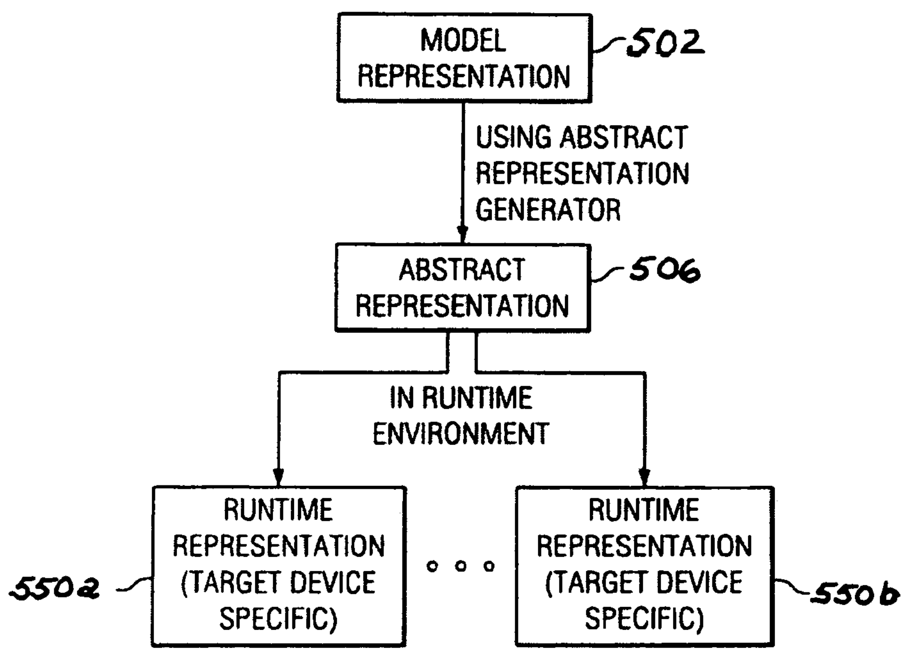
FIG. 5B depicts a simplified process for mapping a model representation to a runtime representation using the example development environment of FIG. 4A or some other development environment.

FIG. 5B depicts an example process for mapping a model representation 502 to a runtime representation using the example modeling environment 516 of FIG. 5A or some other modeling environment. Model representation 502 may comprise one or more model components and associated properties that describe a data object, such as hosted business objects and interfaces. As described above, at least one of these model components is based on or otherwise associated with these hosted business objects and interfaces. The abstract representation 506 is generated based upon model representation 502. Abstract representation 506 may be generated by the abstract representation generator 504. Abstract representation 506 comprises one or more abstract GUI components and properties associated with the abstract GUI components. As part of generation of abstract representation 506, the model GUI components and their associated properties from the model representation are mapped to abstract GUI components and properties associated with the abstract GUI components. Various mapping rules may be provided to facilitate the mapping. The abstract representation encapsulates both appearance and behavior of a GUI. Therefore, by mapping model components to abstract components, the abstract representation not only specifies the visual appearance of the GUI but also the behavior of the GUI, such as in response to events whether clicking/dragging or scrolling, interactions between GUI components and such.

One or more runtime representations 550*a*, including GUIs for specific runtime environment platforms, may be generated from abstract representation 506. A device-dependent runtime representation may be generated for a particular type of target device platform to be used for executing and displaying the GUI encapsulated by the abstract representation. The GUIs generated from abstract representation 506 may comprise various types of GUI elements such as buttons, windows, scrollbars, input boxes, etc. Rules may be provided for mapping an abstract representation to a particular runtime representation. Various mapping rules may be provided for different runtime environment platforms.

Methods and systems consistent with the subject matter described herein provide and use interfaces 320 derived from the business object model 318 suitable for use with more than one business area, for example different departments within a company such as finance, or marketing. Also, they are suitable across industries and across businesses. Interfaces 320 are used during an end-to-end business transaction to transfer business process information in an application-independent manner. For example the interfaces can be used for fulfilling a sales order.

1. Message Overview

To perform an end-to-end business transaction, consistent interfaces are used to create business documents that are sent within messages between heterogeneous programs or modules.

a) Message Categories

As depicted in FIG. 6, the communication between a sender 602 and a recipient 604 can be broken down into basic categories that describe the type of the information exchanged and simultaneously suggest the anticipated reaction of the recipient 604. A message category is a general business classification for the messages. Communication is sender-driven. In other words, the meaning of the message categories is established or formulated from the perspective of the sender 602. The message categories include information 606, notification 608, query 610, response 612, request 614, and confirmation 616.

(1) Information

Information 606 is a message sent from a sender 602 to a recipient 604 concerning a condition or a statement of affairs. No reply to information is expected. Information 606 is sent to make business partners or business applications aware of a situation. Information 606 is not compiled to be application-specific. Examples of "information" are an announcement, advertising, a report, planning information, and a message to the business warehouse.

(2) Notification

A notification 608 is a notice or message that is geared to a service. A sender 602 sends the notification 608 to a recipient 604. No reply is expected for a notification. For example, a billing notification relates to the preparation of an invoice while a dispatched delivery notification relates to preparation for receipt of goods.

(3) Query

A query 610 is a question from a sender 602 to a recipient 604 to which a response 612 is expected. A query 610 implies no assurance or obligation on the part of the sender 602. Examples of a query 610 are whether space is available on a specific flight or whether a specific product is available. These queries do not express the desire for reserving the flight or purchasing the product.

(4) Response

A response 612 is a reply to a query 610. The recipient 604 sends the response 612 to the sender 602. A response 612 generally implies no assurance or obligation on the part of the recipient 604. The sender 602 is not expected to reply. Instead, the process is concluded with the response 612. Depending on the business scenario, a response 612 also may include a commitment, i.e., an assurance or obligation on the part of the recipient 604. Examples of responses 612 are a response stating that space is available on a specific flight or that a specific product is available. With these responses, no reservation was made.

(5) Request

A request 614 is a binding requisition or requirement from a sender 602 to a recipient 604. Depending on the business scenario, the recipient 604 can respond to a request 614 with a confirmation 616. The request 614 is binding on the sender 602. In making the request 614, the sender 602 assumes, for example, an obligation to accept the services rendered in the request 614 under the reported conditions. Examples of a request 614 are a parking ticket, a purchase order, an order for delivery and a job application.

(6) Confirmation

A confirmation 616 is a binding reply that is generally made to a request 614. The recipient 604 sends the confirmation 616 to the sender 602. The information indicated in a confirmation 616, such as deadlines, products, quantities and prices, can deviate from the information of the preceding request 614. A request 614 and confirmation 616 may be used in negotiating processes. A negotiating process can consist of a series of several request 614 and confirmation 616 messages. The confirmation 616 is binding on the recipient 604. For example, 100 units of X may be ordered in a purchase order request; however, only the delivery of 80 units is confirmed in the associated purchase order confirmation.

b) Message Choreography

A message choreography is a template that specifies the sequence of messages between business entities during a given transaction. The sequence with the messages contained in it describes in general the message "lifecycle" as it proceeds between the business entities. If messages from a choreography are used in a business transaction, they appear in the transaction in the sequence determined by the choreography. This illustrates the template character of a choreography, i.e., during an actual transaction, it is not necessary for all messages of the choreography to appear. Those messages that are contained in the transaction, however, follow the sequence within the choreography. A business transaction is thus a derivation of a message choreography. The choreography makes it possible to determine the structure of the individual message types more precisely and distinguish them from one another.

2. Components of the Business Object Model

The overall structure of the business object model ensures the consistency of the interfaces that are derived from the business object model. The derivation ensures that the same business-related subject matter or concept is represented and structured in the same way in all interfaces.

The business object model defines the business-related concepts at a central location for a number of business transactions. In other words, it reflects the decisions made about modeling the business entities of the real world acting in business transactions across industries and business areas. The business object model is defined by the business objects and their relationship to each other (the overall net structure).

A business object is a capsule with an internal hierarchical structure, behavior offered by its operations, and integrity constraints. Business objects are semantically disjoint, i.e., the same business information is represented once. In the business object model, the business objects are arranged in an ordering framework. From left to right, they are arranged according to their existence dependency to each other. For example, the customizing elements may be arranged on the left side of the business object model, the strategic elements may be arranged in the center of the business object model, and the operative elements may be arranged on the right side of the business object model. Similarly, the business objects are arranged from the top to the bottom based on defined order of the business areas, e.g., finance could be arranged at the top of the business object model with CRM below finance and SRM below CRM.

To ensure the consistency of interfaces, the business object model may be built using standardized data types as well as packages to group related elements together, and package templates and entity templates to specify the arrangement of packages and entities within the structure.

a) Data Types

Data types are used to type object entities and interfaces with a structure. This typing can include business semantic. For example, the data type BusinessTransactionDocumentID is a unique identifier for a document in a business transaction. Also, as an example, Data type BusinessTransactionDocumentParty contains the information that is exchanged in business documents about a party involved in a business transaction, and includes the party's identity, the party's address, the party's contact person and the contact person's address. BusinessTransactionDocumentParty also includes the role of the party, e.g., a buyer, seller, product recipient, or vendor.

The data types are based on Core Component Types ("CCTs"), which themselves are based on the World Wide Web Consortium ("W3C") data types. "Global" data types represent a business situation that is described by a fixed structure. Global data types include both context-neutral generic data types ("GDTs") and context-based context data types ("CDTs"). GDTs contain business semantics, but are application-neutral, i.e., without context. CDTs, on the other hand, are based on GDTs and form either a use-specific view of the GDTs, or a context-specific assembly of GDTs or CDTs. A message is typically constructed with reference to a use and is thus a use-specific assembly of GDTs and CDTs. The data types can be aggregated to complex data types.

To achieve a harmonization across business objects and interfaces, the same subject matter is typed with the same data type. For example, the data type "GeoCoordinates" is built using the data type "Measure" so that the measures in a GeoCoordinate (i.e., the latitude measure and the longitude measure) are represented the same as other "Measures" that appear in the business object model.

b) Entities

Entities are discrete business elements that are used during a business transaction. Entities are not to be confused with business entities or the components that interact to perform a transaction. Rather, "entities" are one of the layers of the business object model and the interfaces. For example, a Catalogue entity is used in a Catalogue Publication Request and a Purchase Order is used in a Purchase Order Request. These entities are created using the data types defined above to ensure the consistent representation of data throughout the entities.

c) Packages

Packages group the entities in the business object model and the resulting interfaces into groups of semantically associated information. Packages also may include "sub"-packages, i.e., the packages may be nested.

Packages may group elements together based on different factors, such as elements that occur together as a rule with regard to a business-related aspect. For example, as depicted in FIG. 7, in a Purchase Order, different information regarding the purchase order, such as the type of payment 702, and payment card 704, are grouped together via the PaymentInformation package 700.

Packages also may combine different components that result in a new object. For example, as depicted in FIG. 8, the components wheels 804, motor 806, and doors 808 are combined to form a composition "Car" 802. The "Car" package 800 includes the wheels, motor and doors as well as the composition "Car."

Another grouping within a package may be subtypes within a type. In these packages, the components are specialized forms of a generic package. For example, as depicted in FIG. 9, the components Car 904, Boat 906, and Truck 908 can be generalized by the generic term Vehicle 902 in Vehicle package 900. Vehicle in this case is the generic package 910, while Car 912, Boat 914, and Truck 916 are the specializations 918 of the generalized vehicle 910.

Packages also may be used to represent hierarchy levels. For example, as depicted in FIG. 10, the Item Package 1000 includes Item 1002 with subitem xxx 1004, subitem yyy 1006, and subitem zzz 1008.

Packages can be represented in the XML schema as a comment. One advantage of this grouping is that the document structure is easier to read and is more understandable. The names of these packages are assigned by including the object name in brackets with the suffix "Package." For example, as depicted in FIG. 11, Party package 1100 is enclosed by <PartyPackage> 1102 and </PartyPackage> 1104. Party package 1100 illustratively includes a Buyer Party 1106, identified by <BuyerParty> 1108 and <BuyerParty> 1110, and a Seller Party 1112, identified by <SellerParty> 1114 and </SellerParty>, etc.

d) Relationships

Relationships describe the interdependencies of the entities in the business object model, and are thus an integral part of the business object model.

(1) Cardinality of Relationships

FIG. 12 depicts a graphical representation of the cardinalities between two entities. The cardinality between a first entity and a second entity identifies the number of second entities that could possibly exist for each first entity. Thus, a 1:c cardinality 1200 between entities A 1202 and X 1204 indicates that for each entity A 1202, there is either one or zero 1206 entity X 1204. A 1:1 cardinality 1208 between entities A 1210 and X 1212 indicates that for each entity A 1210, there is exactly one 1214 entity X 1212. A 1:n cardinality 1216 between entities A 1218 and X 1220 indicates that for each entity A 1218, there are one or more 1222 entity Xs 1220. A 1:cn cardinality 1224 between entities A 1226 and X 1228 indicates that for each entity A 1226, there are any number 1230 of entity Xs 1228 (i.e., 0 through n Xs for each A).

(2) Types of Relationships (a) Composition

A composition or hierarchical relationship type is a strong whole-part relationship which is used to describe the structure within an object. The parts, or dependent entities, represent a semantic refinement or partition of the whole, or less dependent entity. For example, as depicted in FIG. 13, the components 1302, wheels 1304, and doors 1306 may be combined to form the composite 1300 "Car" 1308 using the composition 1310. FIG. 14 depicts a graphical representation of the composition 1410 between composite Car 1408 and components wheel 1404 and door 1406.

(b) Aggregation

Figure 15:
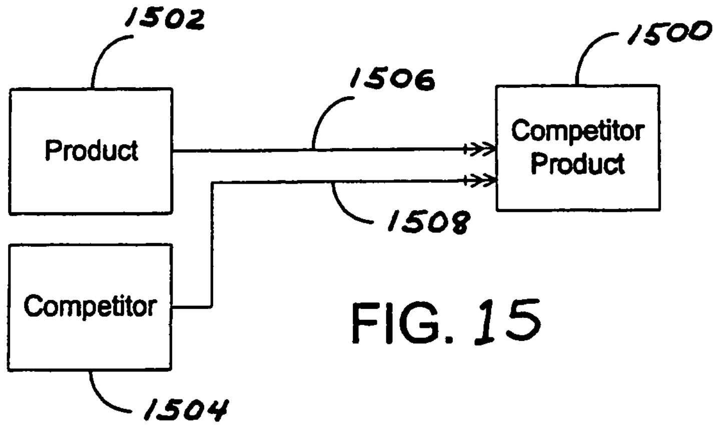
FIG. 15 depicts an example of an aggregating relationship in accordance with methods and systems consistent with the subject matter described herein.

An aggregation or an aggregating relationship type is a weak whole-part relationship between two objects. The dependent object is created by the combination of one or several less dependent objects. For example, as depicted in FIG. 15, the properties of a competitor product 1500 are determined by a product 1502 and a competitor 1504. A hierarchical relationship 1506 exists between the product 1502 and the competitor product 1500 because the competitor product 1500 is a component of the product 1502. Therefore, the values of the attributes of the competitor product 1500 are determined by the product 1502. An aggregating relationship 1508 exists between the competitor 1504 and the competitor product 1500 because the competitor product 1500 is differentiated by the competitor 1504. Therefore the values of the attributes of the competitor product 1500 are determined by the competitor 1504.

(c) Association

An association or a referential relationship type describes a relationship between two objects in which the dependent object refers to the less dependent object. For example, as depicted in FIG. 16, a person 1600 has a nationality, and thus, has a reference to its country 1602 of origin. There is an association 1604 between the country 1602 and the person 1600. The values of the attributes of the person 1600 are not determined by the country 1602.

(3) Specialization

Entity types may be divided into subtypes based on characteristics of the entity types. For example, FIG. 17 depicts an entity type "vehicle" 1700 specialized 1702 into subtypes "truck" 1704, "car" 1706, and "ship" 1708. These subtypes represent different aspects or the diversity of the entity type.

Subtypes may be defined based on related attributes. For example, although ships and cars are both vehicles, ships have an attribute, "draft," that is not found in cars. Subtypes also may be defined based on certain methods that can be applied to entities of this subtype and that modify such entities. For example, "drop anchor" can be applied to ships. If outgoing relationships to a specific object are restricted to a subset, then a subtype can be defined which reflects this subset.

As depicted in FIG. 18, specializations may further be characterized as complete specializations 1800 or incomplete specializations 1802. There is a complete specialization 1800 where each entity of the generalized type belongs to at least one subtype. With an incomplete specialization 1802, there is at least one entity that does not belong to a subtype. Specializations also may be disjoint 1804 or nondisjoint 1806. In a disjoint specialization 1804, each entity of the generalized type belongs to a maximum of one subtype. With a nondisjoint specialization 1806, one entity may belong to more than one subtype. As depicted in FIG. 18, four specialization categories result from the combination of the specialization characteristics.

e) Structural Patterns (1) Item

An item is an entity type which groups together features of another entity type. Thus, the features for the entity type chart of accounts are grouped together to form the entity type chart of accounts item. For example, a chart of accounts item is a category of values or value flows that can be recorded or represented in amounts of money in accounting, while a chart of accounts is a superordinate list of categories of values or value flows that is defined in accounting.

The cardinality between an entity type and its item is often either 1:n or 1:cn. For example, in the case of the entity type chart of accounts, there is a hierarchical relationship of the cardinality 1:n with the entity type chart of accounts item since a chart of accounts has at least one item in all cases.

(2) Hierarchy

A hierarchy describes the assignment of subordinate entities to superordinate entities and vice versa, where several entities of the same type are subordinate entities that have, at most, one directly superordinate entity. For example, in the hierarchy depicted in FIG. 19, entity B 1902 is subordinate to entity A 1900, resulting in the relationship (A,B) 1912. Similarly, entity C 1904 is subordinate to entity A 1900, resulting in the relationship (A,C) 1914. Entity D 1906 and entity E 1908 are subordinate to entity B 1902, resulting in the relationships (B,D) 1916 and (B,E) 1918, respectively. Entity F 1910 is subordinate to entity C 1904, resulting in the relationship (C,F) 1920.

Because each entity has at most one superordinate entity, the cardinality between a subordinate entity and its superordinate entity is 1:c. Similarly, each entity may have 0, 1 or many subordinate entities. Thus, the cardinality between a superordinate entity and its subordinate entity is 1:cn. FIG. 20 depicts a graphical representation of a Closing Report Structure Item hierarchy 2000 for a Closing Report Structure Item 2002. The hierarchy illustrates the 1:c cardinality 2004 between a subordinate entity and its superordinate entity, and the 1:cn cardinality 2006 between a superordinate entity and its subordinate entity.

3. Creation of the Business Object Model

Figure 21A:
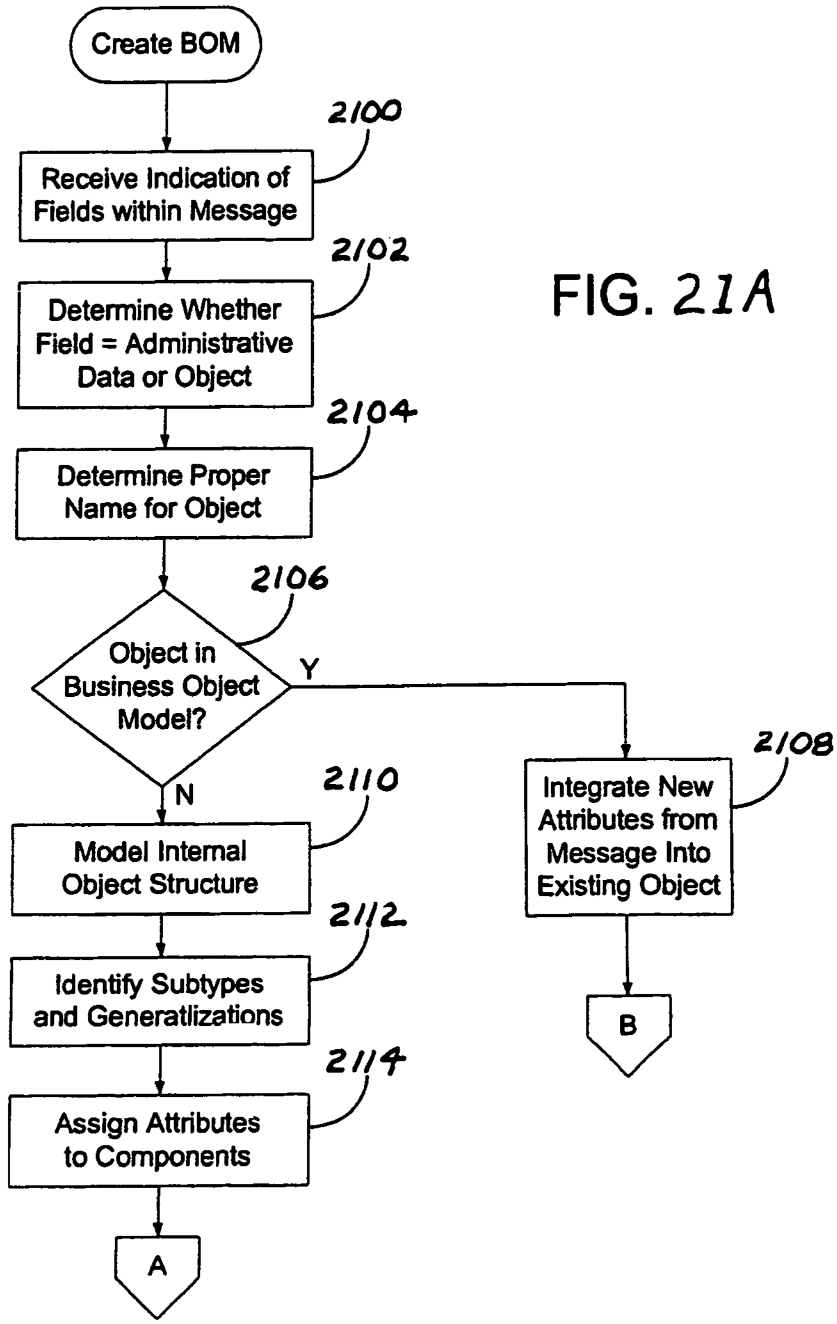
FIGS. 21A-B depict a flow diagram of the steps performed to create a business object model in accordance with methods and systems consistent with the subject matter described herein.
Figure 21B:
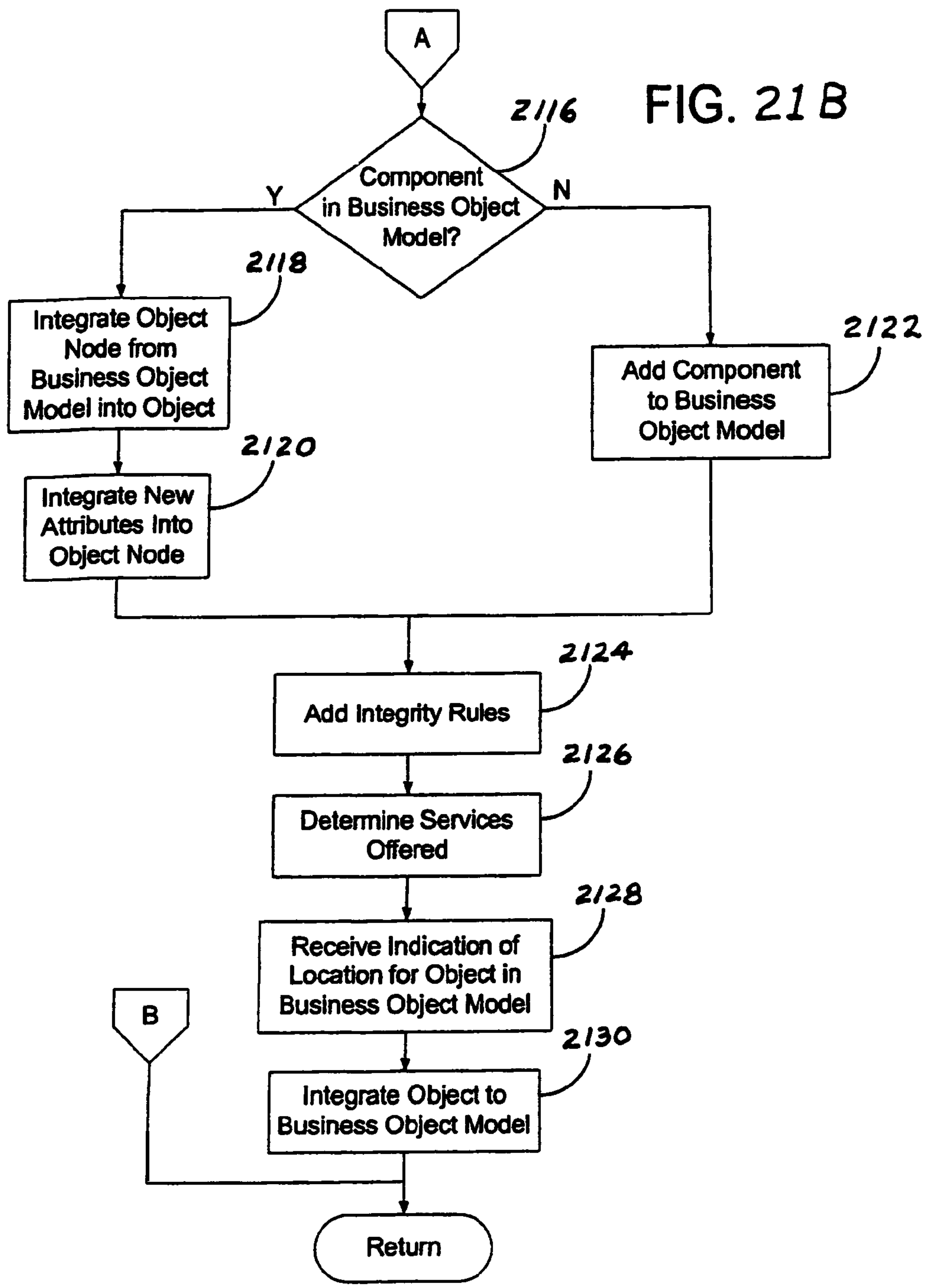

FIGS. 21A-B depict the steps performed using methods and systems consistent with the subject matter described herein to create a business object model. Although some steps are described as being performed by a computer, these steps may alternatively be performed manually, or computer-assisted, or any combination thereof. Likewise, although some steps are described as being performed by a computer, these steps may also be computer-assisted, or performed manually, or any combination thereof.

As discussed above, the designers create message choreographies that specify the sequence of messages between business entities during a transaction. After identifying the messages, the developers identify the fields contained in one of the messages (step 2100, FIG. 21A). The designers then determine whether each field relates to administrative data or is part of the object (step 2102). Thus, the first eleven fields identified below in the left column are related to administrative data, while the remaining fields are part of the object.

| | |
|---|---|
| MessageID | Admin |
| ReferenceID | |
| CreationDate | |
| SenderID | |
| AdditionalSenderID | |
| ContactPersonID | |
| SenderAddress | |
| RecipientID | |
| AdditionalRecipientID | |
| ContactPersonID | |
| RecipientAddress | |
| ID | Main Object |
| AdditionalID | |
| PostingDate | |
| LastChangeDate | |
| AcceptanceStatus | |
| Note | |
| CompleteTransmission Indicator | |
| Buyer | |
| BuyerOrganisationName | |
| Person Name | |
| FunctionalTitle | |
| DepartmentName | |
| CountryCode | |
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobileNumber | |
| Facsimile | |
| Email | |
| Seller | |
| SellerAddress | |
| Location | |
| LocationType | |
| DeliveryItemGroupID | |
| DeliveryPriority | |
| DeliveryCondition | |
| TransferLocation | |
| NumberofPartialDelivery | |
| QuantityTolerance | |
| MaximumLeadTime | |
| TransportServiceLevel | |
| TranportCondition | |
| TransportDescription | |
| CashDiscountTerms | |
| PaymentForm | |
| PaymentCardID | |
| PaymentCardReferenceID | |
| SequenceID | |
| Holder | |
| ExpirationDate | |
| AttachmentID | |
| AttachmentFilename | |
| DescriptionofMessage | |
| ConfirmationDescriptionof Message | |
| FollowUpActivity | |
| ItemID | |
| ParentItemID | |
| HierarchyType | |
| ProductID | |
| ProductType | |
| ProductNote | |
| ProductCategoryID | |

-continued

| |
|---|
| Amount |
| BaseQuantity |
| ConfirmedAmount |
| ConfirmedBaseQuantity |
| ItemBuyer |
| ItemBuyerOrganisationName |
| Person Name |
| FunctionalTitle |
| DepartmentName |
| CountryCode |
| StreetPostalCode |
| POBox Postal Code |
| Company Postal Code |
| City Name |
| DistrictName |
| PO Box ID |
| PO Box Indicator |
| PO Box Country Code |
| PO Box Region Code |
| PO Box City Name |
| Street Name |
| House ID |
| Building ID |
| Floor ID |
| Room ID |
| Care Of Name |
| AddressDescription |
| Telefonnumber |
| MobilNumber |
| Facsimile |
| Email |
| ItemSeller |
| ItemSellerAddress |
| ItemLocation |
| ItemLocationType |
| ItemDeliveryItemGroupID |
| ItemDeliveryPriority |
| ItemDeliveryCondition |
| ItemTransferLocation |
| ItemNumberofPartialDelivery |
| ItemQuantityTolerance |
| ItemMaximumLeadTime |
| ItemTransportServiceLevel |
| ItemTranportCondition |
| ItemTransportDescription |
| ContractReference |
| QuoteReference |
| CatalogueReference |
| ItemAttachmentID |
| ItemAttachmentFilename |
| ItemDescription |
| ScheduleLineID |
| DeliveryPeriod |
| Quantity |
| ConfirmedScheduleLineID |
| ConfirmedDeliveryPeriod |
| ConfirmedQuantity |

Next, the designers determine the proper name for the object according to the ISO 11179 naming standards (step 2104). In the example above, the proper name for the "Main Object" is "Purchase Order." After naming the object, the system that is creating the business object model determines whether the object already exists in the business object model (step 2106). If the object already exists, the system integrates new attributes from the message into the existing object (step 2108), and the process is complete.

If at step 2106 the system determines that the object does not exist in the business object model, the designers model the internal object structure (step 2110). To model the internal structure, the designers define the components. For the above example, the designers may define the components identified below.

| | | | |
|---|---|---|---|
| ID | Purchase Order | | |
| AdditionalID | | | |
| PostingDate | | | |
| LastChangeDate | | | |
| AcceptanceStatus | | | |
| Note | | | |
| CompleteTransmission Indicator | | | |
| Buyer | | Buyer | |
| BuyerOrganisationName | | | |
| Person Name | | | |
| FunctionalTitle | | | |
| DepartmentName | | | |
| CountryCode | | | |
| StreetPostalCode | | | |
| POBox Postal Code | | | |
| Company Postal Code | | | |
| City Name | | | |
| DistrictName | | | |
| PO Box ID | | | |
| PO Box Indicator | | | |
| PO Box Country Code | | | |
| PO Box Region Code | | | |
| PO Box City Name | | | |
| Street Name | | | |
| House ID | | | |
| Building ID | | | |
| Floor ID | | | |
| Room ID | | | |
| Care Of Name | | | |
| AddressDescription | | | |
| Telefonnumber | | | |
| MobileNumber | | | |
| Facsimile | | | |
| Email | | | |
| Seller | | Seller | |
| SellerAddress | | | |
| Location | | Location | |
| LocationType | | | |
| DeliveryItemGroupID | | DeliveryTerms | |
| DeliveryPriority | | | |
| DeliveryCondition | | | |
| TransferLocation | | | |
| NumberofPartialDelivery | | | |
| QuantityTolerance | | | |
| MaximumLeadTime | | | |
| TransportServiceLevel | | | |
| TranportCondition | | | |
| TransportDescription | | | |
| CashDiscountTerms | | | |
| PaymentForm | | Payment | |
| PaymentCardID | | | |
| PaymentCardReferenceID | | | |
| SequenceID | | | |
| Holder | | | |
| ExpirationDate | | | |
| AttachmentID | | | |
| AttachmentFilename | | | |
| DescriptionofMessage | | | |
| ConfirmationDescriptionof Message | | | |
| FollowUpActivity | | | |
| ItemID | | Purchase Order Item | |
| ParentItemID | | | |
| HierarchyType | | | |
| ProductID | | | Product |
| ProductType | | | |
| ProductNote | | | |
| ProductCategoryID | | | ProductCategory |
| Amount | | | |
| BaseQuantity | | | |
| ConfirmedAmount | | | |
| ConfirmedBaseQuantity | | | |
| ItemBuyer | | | Buyer |
| ItemBuyerOrganisation Name | | | |
| Person Name | | | |
| FunctionalTitle | | | |
| DepartmentName | | | |
| CountryCode | | | |

-continued

| | |
|---|---|
| StreetPostalCode | |
| POBox Postal Code | |
| Company Postal Code | |
| City Name | |
| DistrictName | |
| PO Box ID | |
| PO Box Indicator | |
| PO Box Country Code | |
| PO Box Region Code | |
| PO Box City Name | |
| Street Name | |
| House ID | |
| Building ID | |
| Floor ID | |
| Room ID | |
| Care Of Name | |
| AddressDescription | |
| Telefonnumber | |
| MobilNumber | |
| Facsimile | |
| Email | |
| ItemSeller | Seller |
| ItemSellerAddress | |
| ItemLocation | Location |
| ItemLocationType | |
| ItemDeliveryItemGroupID | |
| ItemDeliveryPriority | |
| ItemDeliveryCondition | |
| ItemTransferLocation | |
| ItemNumberofPartial Delivery | |
| ItemQuantityTolerance | |
| ItemMaximumLeadTime | |
| ItemTransportServiceLevel | |
| ItemTranportCondition | |
| ItemTransportDescription | |
| ContractReference | Contract |
| QuoteReference | Quote |
| CatalogueReference | Catalogue |
| ItemAttachmentID | |
| ItemAttachmentFilename | |
| ItemDescription | |
| ScheduleLineID | |
| DeliveryPeriod | |
| Quantity | |
| ConfirmedScheduleLineID | |
| ConfirmedDeliveryPeriod | |
| ConfirmedQuantity | |

During the step of modeling the internal structure, the designers also model the complete internal structure by identifying the compositions of the components and the corresponding cardinalities, as shown below.

| | | | | |
|---|---|---|---|---|
| PurchaseOrder | | | | 1 |
| | Buyer | | | 0 . . . 1 |
| | | Address | | 0 . . . 1 |
| | | ContactPerson | | 0 . . . 1 |
| | | | Address | 0 . . . 1 |
| | Seller | | | 0 . . . 1 |
| | Location | | | 0 . . . 1 |
| | | Address | | 0 . . . 1 |
| | DeliveryTerms | | | 0 . . . 1 |
| | | Incoterms | | 0 . . . 1 |
| | | PartialDelivery | | 0 . . . 1 |
| | | QuantityTolerance | | 0 . . . 1 |
| | | Transport | | 0 . . . 1 |
| | CashDiscountTerms | | | 0 . . . 1 |
| | | MaximumCashDiscount | | 0 . . . 1 |
| | | NormalCashDiscount | | 0 . . . 1 |
| | PaymentForm | | | 0 . . . 1 |
| | | PaymentCard | | 0 . . . 1 |
| | Attachment | | | 0 . . . n |
| | Description | | | 0 . . . 1 |
| | Confirmation Description | | | 0 . . . 1 |
| | Item | | | 0 . . . n |
| | | HierarchyRelationship | | 0 . . . 1 |
| | | Product | | 0 . . . 1 |
| | | ProductCategory | | 0 . . . 1 |
| | | Price | | 0 . . . 1 |
| | | | NetUnitPrice | 0 . . . 1 |
| | | ConfirmedPrice | | 0 . . . 1 |
| | | | NetUnitPrice | 0 . . . 1 |
| | | Buyer | | 0 . . . 1 |
| | | Seller | | 0 . . . 1 |
| | | Location | | 0 . . . 1 |
| | | DeliveryTerms | | 0 . . . 1 |
| | | Attachment | | 0 . . . n |
| | | Description | | 0 . . . 1 |
| | | ConfirmationDescription | | 0 . . . 1 |
| | | ScheduleLine | | 0 . . . n |
| | | | DeliveryPeriod | 1 |
| | | ConfirmedScheduleLine | | 0 . . . n |

After modeling the internal object structure, the developers identify the subtypes and generalizations for all objects and components (step 2112). For example, the Purchase Order may have subtypes Purchase Order Update, Purchase Order Cancellation and Purchase Order Information. Purchase Order Update may include Purchase Order Request, Purchase Order Change, and Purchase Order Confirmation. Moreover, Party may be identified as the generalization of Buyer and Seller. The subtypes and generalizations for the above example are shown below.

| | | | | | |
|---|---|---|---|---|---|
| PurchaseOrder | | | | | 1 |
| | PurchaseOrder Update | | | | |
| | | PurchaseOrder Request | | | |
| | | PurchaseOrder Change | | | |
| | | PurchaseOrder Confirmation | | | |
| | PurchaseOrder Cancellation | | | | |
| | PurchaseOrder Information | | | | |
| | Party | | | | |
| | | BuyerParty | | | 0 . . . 1 |
| | | | Address | | 0 . . . 1 |
| | | | ContactPerson | | 0 . . . 1 |
| | | | | Address | 0 . . . 1 |
| | | SellerParty | | | 0 . . . 1 |
| | Location | | | | |
| | | ShipToLocation | | | 0 . . . 1 |
| | | | Address | | 0 . . . 1 |
| | | ShipFromLocation | | | 0 . . . 1 |
| | | | Address | | 0 . . . 1 |
| | DeliveryTerms | | | | 0 . . . 1 |
| | | Incoterms | | | 0 . . . 1 |
| | | PartialDelivery | | | 0 . . . 1 |
| | | QuantityTolerance | | | 0 . . . 1 |
| | | Transport | | | 0 . . . 1 |
| | CashDiscount Terms | | | | 0 . . . 1 |
| | | MaximumCash Discount | | | 0 . . . 1 |
| | | NormalCashDiscount | | | 0 . . . 1 |
| | PaymentForm | | | | 0 . . . 1 |
| | | PaymentCard | | | 0 . . . 1 |
| | Attachment | | | | 0 . . . n |
| | Description | | | | 0 . . . 1 |
| | Confirmation Description | | | | 0 . . . 1 |
| | Item | | | | 0 . . . n |
| | | HierarchyRelationship | | | 0 . . . 1 |
| | | Product | | | 0 . . . 1 |
| | | ProductCategory | | | 0 . . . 1 |
| | | Price | | | 0 . . . 1 |
| | | | NetUnitPrice | | 0 . . . 1 |
| | | ConfirmedPrice | | | 0 . . . 1 |
| | | | NetUnitPrice | | 0 . . . 1 |
| | | Party | | | |
| | | | BuyerParty | | 0 . . . 1 |
| | | | SellerParty | | 0 . . . 1 |
| | | Location | | | |
| | | | ShipTo Location | | 0 . . . 1 |
| | | | ShipFrom Location | | 0 . . . 1 |
| | | DeliveryTerms | | | 0 . . . 1 |
| | | Attachment | | | 0 . . . n |
| | | Description | | | 0 . . . 1 |
| | | Confirmation Description | | | 0 . . . 1 |
| | | ScheduleLine | | | 0 . . . n |
| | | | Delivery Period | | 1 |
| | | ConfirmedScheduleLine | | | 0 . . . n |

After identifying the subtypes and generalizations, the developers assign the attributes to these components (step 2114). The attributes for a portion of the components are shown below.

| | | | | |
|---|---|---|---|---|
| Purchase Order | | | | 1 |
| | ID | | | 1 |
| | SellerID | | | 0 . . . 1 |
| | BuyerPosting DateTime | | | 0 . . . 1 |
| | BuyerLast ChangeDate Time | | | 0 . . . 1 |
| | SellerPosting DateTime | | | 0 . . . 1 |
| | SellerLast ChangeDate Time | | | 0 . . . 1 |
| | Acceptance StatusCode | | | 0 . . . 1 |
| | Note | | | 0 . . . 1 |
| | ItemList Complete | | | 0 . . . 1 |
| | Transmission Indicator | | | |
| | BuyerParty | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | | ContactPerson | | 0 . . . 1 |
| | | | BuyerID | 0 . . . 1 |
| | | | SellerID | 0 . . . 1 |
| | | | Address | 0 . . . 1 |
| | SellerParty | | | 0 . . . 1 |
| | Product RecipientParty | | | 0 . . . 1 |
| | VendorParty | | | 0 . . . 1 |
| | Manufacturer Party | | | 0 . . . 1 |
| | BillToParty | | | 0 . . . 1 |
| | PayerParty | | | 0 . . . 1 |
| | CarrierParty | | | 0 . . . 1 |
| | ShipTo Location | | | 0 . . . 1 |
| | | StandardID | | 0 . . . n |
| | | BuyerID | | 0 . . . 1 |
| | | SellerID | | 0 . . . 1 |
| | | Address | | 0 . . . 1 |
| | ShipFrom Location | | | 0 . . . 1 |

The system then determines whether the component is one of the object nodes in the business object model (step 2116, FIG. 21B). If the system determines that the component is one of the object nodes in the business object model, the system integrates a reference to the corresponding object node from the business object model into the object (step 2118). In the above example, the system integrates the reference to the Buyer party represented by an ID and the reference to the ShipToLocation represented by an into the object, as shown below. The attributes that were formerly located in the PurchaseOrder object are now assigned to the new found object party. Thus, the attributes are removed from the PurchaseOrder object.

| | | |
|---|---|---|
| PurchaseOrder | | |
| | ID | |
| | SellerID | |
| | BuyerPostingDateTime | |
| | BuyerLastChangeDateTime | |
| | SellerPostingDateTime | |
| | SellerLastChangeDateTime | |
| | AcceptanceStatusCode | |
| | Note | |
| | ItemListComplete | |
| | TransmissionIndicator | |
| | BuyerParty | |
| | | ID |
| | SellerParty | |
| | ProductRecipientParty | |
| | VendorParty | |
| | ManufacturerParty | |
| | BillToParty | |
| | PayerParty | |
| | CarrierParty | |
| | ShipToLocation | |
| | | ID |
| | ShipFromLocation | |

During the integration step, the designers classify the relationship (i.e., aggregation or association) between the object node and the object being integrated into the business object model. The system also integrates the new attributes into the object node (step 2120). If at step 2116, the system determines that the component is not in the business object model, the system adds the component to the business object model (step 2122).

Regardless of whether the component was in the business object model at step 2116, the next step in creating the business object model is to add the integrity rules (step 2124). There are several levels of integrity rules and constraints which should be described. These levels include consistency rules between attributes, consistency rules between components, and consistency rules to other objects. Next, the designers determine the services offered, which can be accessed via interfaces (step 2126). The services offered in the example above include PurchaseOrderCreateRequest, PurchaseOrderCancellationRequest, and PurchaseOrderReleaseRequest. The system then receives an indication of the location for the object in the business object model (step 2128). After receiving the indication of the location, the system integrates the object into the business object model (step 2130).

4. Structure of the Business Object Model

The business object model, which serves as the basis for the process of generating consistent interfaces, includes the elements contained within the interfaces. These elements are arranged in a hierarchical structure within the business object model.

5. Interfaces Derived from Business Object Model

Interfaces are the starting point of the communication between two business entities. The structure of each interface determines how one business entity communicates with another business entity. The business entities may act as a unified whole when, based on the business scenario, the business entities know what an interface contains from a business perspective and how to fill the individual elements or fields of the interface. Communication between components takes place via messages that contain business documents. The business document ensures a holistic business-related understanding for the recipient of the message. The business documents are created and accepted or consumed by interfaces, specifically by inbound and outbound interfaces. The interface structure and, hence, the structure of the business document are derived by a mapping rule. This mapping rule is known as "hierarchization." An interface structure thus has a hierarchical structure created based on the leading business object. The interface represents a usage-specific, hierarchical view of the underlying usage-neutral object model.

Figure 27A:
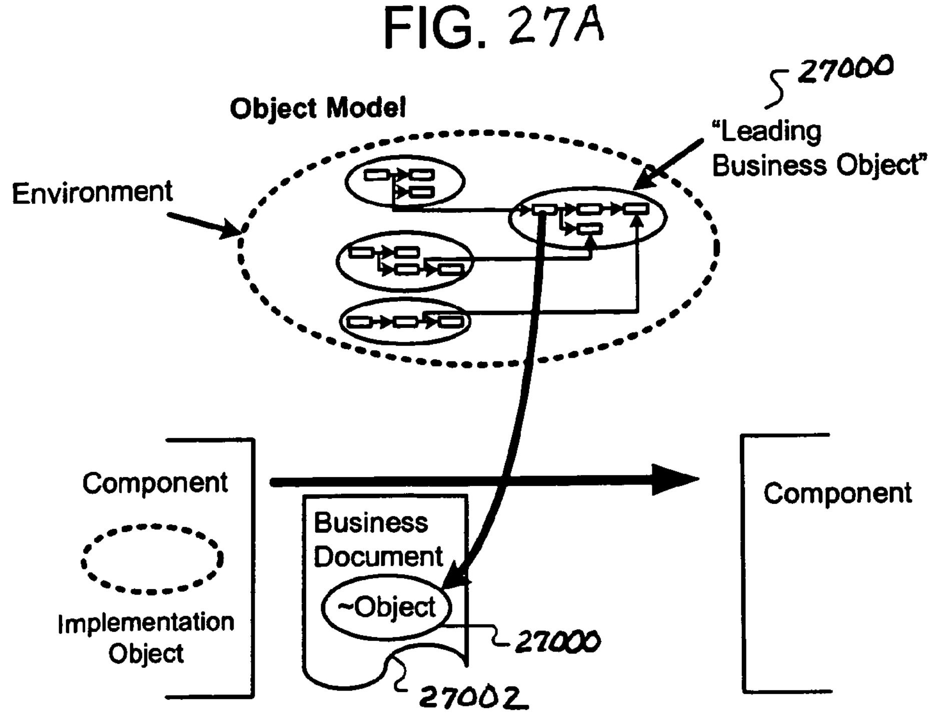
Figure 27B:
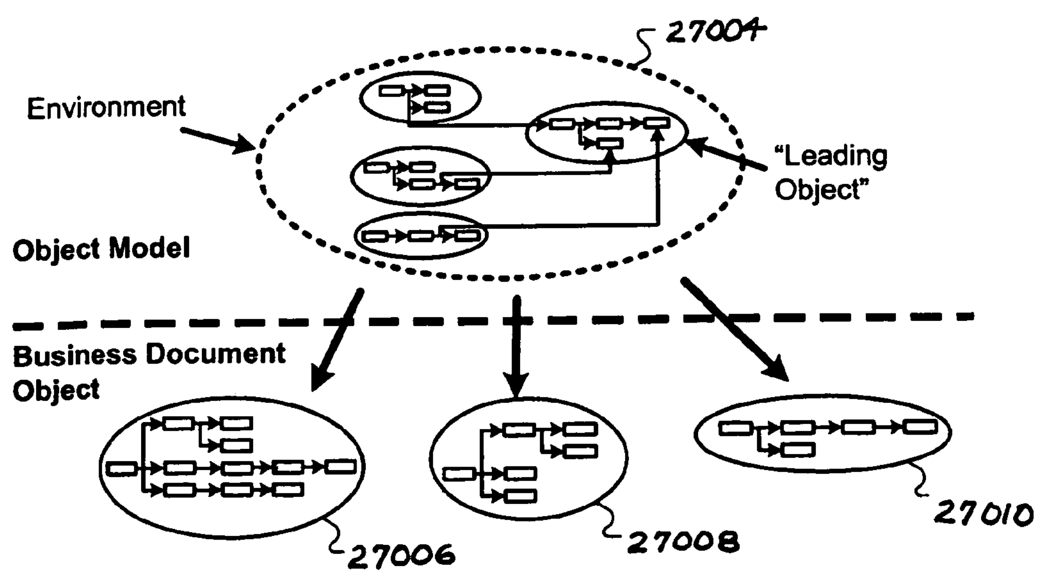

As illustrated in FIG. 27B, several business document objects 27006, 27008, and 27010 as overlapping views may be derived for a given leading object 27004. Each business document object results from the object model by hierarchization.

Figure 27C:
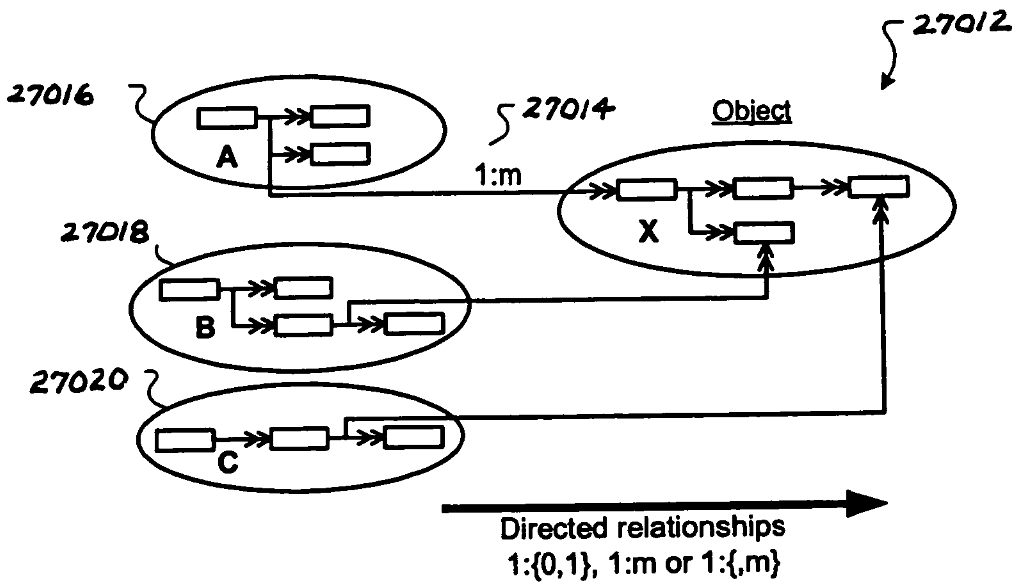

To illustrate the hierarchization process, FIG. 27C depicts an example of an object model 27012 (i.e., a portion of the business object model) that is used to derive a service operation signature (business document object structure). As depicted, leading object X 27014 in the object model 27012 is integrated in a net of object A 27016, object B 27018, and object C 27020. Initially, the parts of the leading object 27014 that are required for the business object document are adopted. In one variation, all parts required for a business document object are adopted from leading object 27014 (making such an operation a maximal service operation). Based on these parts, the relationships to the superordinate objects (i.e., objects A, B, and C from which object X depends) are inverted. In other words, these objects are adopted as dependent or subordinate objects in the new business document object.

For example, object A 27016, object B 27018, and object C 27020 have information that characterize object X. Because object A 27016, object B 27018, and object C 27020 are superordinate to leading object X 27014, the dependencies of these relationships change so that object A 27016, object B 27018, and object C 27020 become dependent and subordinate to leading object X 27014. This procedure is known as "derivation of the business document object by hierarchization."

Business-related objects generally have an internal structure (parts). This structure can be complex and reflect the individual parts of an object and their mutual dependency. When creating the operation signature, the internal structure of an object is strictly hierarchized. Thus, dependent parts keep their dependency structure, and relationships between the parts within the object that do not represent the hierarchical structure are resolved by prioritizing one of the relationships.

Relationships of object X to external objects that are referenced and whose information characterizes object X are added to the operation signature. Such a structure can be quite complex (see, for example, FIG. 27D). The cardinality to these referenced objects is adopted as 1:1 or 1:C, respectively. By this, the direction of the dependency changes. The required parts of this referenced object are adopted identically, both in their cardinality and in their dependency arrangement.

Figure 27D:
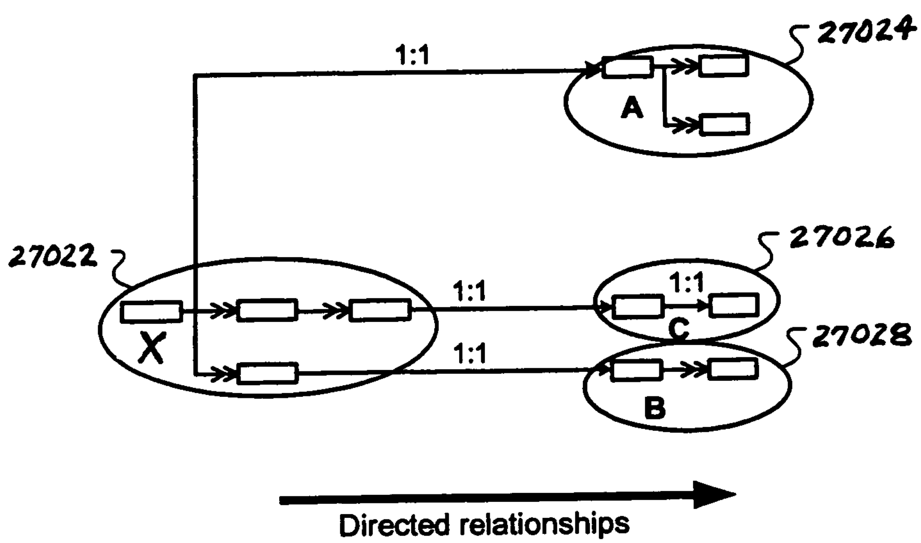

The newly created business document object contains all required information, including the incorporated master data information of the referenced objects. As depicted in FIG. 27D, components Xi in leading object X 27022 are adopted directly. The relationship of object X 27022 to object A 27024, object B 27028, and object C 27026 are inverted, and the parts required by these objects are added as objects that depend from object X 27022. As depicted, all of object A 27024 is adopted. B3 and B4 are adopted from object B 27028, but B1 is not adopted. From object C 27026, C2 and C1 are adopted, but C3 is not adopted.

FIG. 27E depicts the business document object X 27030 created by this hierarchization process. As shown, the arrangement of the elements corresponds to their dependency levels, which directly leads to a corresponding representation as an XML structure 27032.

The following provides certain rules that can be adopted singly or in combination with regard to the hierarchization process:

- A business document object always refers to a leading business document object and is derived from this object.
- The name of the root entity in the business document entity is the name of the business object or the name of a specialization of the business object or the name of a service specific view onto the business object.
- The nodes and elements of the business object that are relevant (according to the semantics of the associated message type) are contained as entities and elements in the business document object.
- The name of a business document entity is predefined by the name of the corresponding business object node. The name of the superordinate entity is not repeated in the name of the business document entity. The "full" semantic name results from the concatenation of the entity names along the hierarchical structure of the business document object.
- The structure of the business document object is, except for deviations due to hierarchization, the same as the structure of the business object.
- The cardinalities of the business document object nodes and elements are adopted identically or more restrictively to the business document object.
- An object from which the leading business object is dependent can be adopted to the business document object. For this arrangement, the relationship is inverted, and the object (or its parts, respectively) are hierarchically subordinated in the business document object.
- Nodes in the business object representing generalized business information can be adopted as explicit entities to the business document object (generally speaking, multiply TypeCodes out). When this adoption occurs, the entities are named according to their more specific semantic (name of TypeCode becomes prefix).
  - Party nodes of the business object are modeled as explicit entities for each party role in the business document object. These nodes are given the name <Prefix><Party Role>Party, for example, BuyerParty, ItemBuyerParty.
  - BTDReference nodes are modeled as separate entities for each reference type in the business document object. These nodes are given the name <Qualifier><BO><Node>Reference, for example SalesOrderReference, OriginSalesOrderReference, SalesOrderItemReference.
  - A product node in the business object comprises all of the information on the Product, ProductCategory, and Batch. This information is modeled in the business document object as explicit entities for Product, ProductCategory, and Batch.
- Entities which are connected by a 1:1 relationship as a result of hierarchization can be combined to a single entity, if they are semantically equivalent. Such a combination can often occurs if a node in the business document object that results from an assignment node is removed because it does not have any elements.
- The message type structure is typed with data types.
  - Elements are typed by GDTs according to their business objects.
  - Aggregated levels are typed with message type specific data types (Intermediate Data Types), with their names being built according to the corresponding paths in the message type structure.

The whole message type structured is typed by a message data type with its name being built according to the root entity with the suffix "Message".

For the message type, the message category (e.g., information, notification, query, response, request, confirmation, etc.) is specified according to the suited transaction communication pattern.

In one variation, the derivation by hierarchization can be initiated by specifying a leading business object and a desired view relevant for a selected service operation. This view determines the business document object. The leading business object can be the source object, the target object, or a third object. Thereafter, the parts of the business object required for the view are determined. The parts are connected to the root node via a valid path along the hierarchy. Thereafter, one or more independent objects (object parts, respectively) referenced by the leading object which are relevant for the service may be determined (provided that a relationship exists between the leading object and the one or more independent objects).

Once the selection is finalized, relevant nodes of the leading object node that are structurally identical to the message type structure can then be adopted. If nodes are adopted from independent objects or object parts, the relationships to such independent objects or object parts are inverted. Linearization can occur such that a business object node containing certain TypeCodes is represented in the message type structure by explicit entities (an entity for each value of the TypeCode). The structure can be reduced by checking all 1:1 cardinalities in the message type structure. Entities can be combined if they are semantically equivalent, one of the entities carries no elements, or an entity solely results from an n:m assignment in the business object.

After the hierarchization is completed, information regarding transmission of the business document object (e.g., CompleteTransmissionIndicator, ActionCodes, message category, etc.) can be added. A standardized message header can be added to the message type structure and the message structure can be typed. Additionally, the message category for the message type can be designated.

Invoice Request and Invoice Confirmation are examples of interfaces. These invoice interfaces are used to exchange invoices and invoice confirmations between an invoicing party and an invoice recipient (such as between a seller and a buyer) in a B2B process. Companies can create invoices in electronic as well as in paper form. Traditional methods of communication, such as mail or fax, for invoicing are cost intensive, prone to error, and relatively slow, since the data is recorded manually. Electronic communication eliminates such problems. The motivating business scenarios for the Invoice Request and Invoice Confirmation interfaces are the Procure to Stock (PTS) and Sell from Stock (SFS) scenarios. In the PTS scenario, the parties use invoice interfaces to purchase and settle goods. In the SFS scenario, the parties use invoice interfaces to sell and invoice goods. The invoice interfaces directly integrate the applications implementing them and also form the basis for mapping data to widely-used XML standard formats such as RosettaNet, PIDX, xCBL, and CIDX.

The invoicing party may use two different messages to map a B2B invoicing process: (1) the invoicing party sends the message type InvoiceRequest to the invoice recipient to start a new invoicing process; and (2) the invoice recipient sends the message type InvoiceConfirmation to the invoicing party to confirm or reject an entire invoice or to temporarily assign it the status "pending."

An InvoiceRequest is a legally binding notification of claims or liabilities for delivered goods and rendered services—usually, a payment request for the particular goods and services. The message type InvoiceRequest is based on the message data type InvoiceMessage. The InvoiceRequest message (as defined) transfers invoices in the broader sense. This includes the specific invoice (request to settle a liability), the debit memo, and the credit memo.

InvoiceConfirmation is a response sent by the recipient to the invoicing party confirming or rejecting the entire invoice received or stating that it has been assigned temporarily the status "pending." The message type InvoiceConfirmation is based on the message data type InvoiceMessage. An InvoiceConfirmation is not mandatory in a B2B invoicing process, however, it automates collaborative processes and dispute management.

Usually, the invoice is created after it has been confirmed that the goods were delivered or the service was provided. The invoicing party (such as the seller) starts the invoicing process by sending an InvoiceRequest message. Upon receiving the InvoiceRequest message, the invoice recipient (for instance, the buyer) can use the InvoiceConfirmation message to completely accept or reject the invoice received or to temporarily assign it the status "pending." The InvoiceConfirmation is not a negotiation tool (as is the case in order management), since the options available are either to accept or reject the entire invoice. The invoice data in the InvoiceConfirmation message merely confirms that the invoice has been forwarded correctly and does not communicate any desired changes to the invoice. Therefore, the InvoiceConfirmation includes the precise invoice data that the invoice recipient received and checked. If the invoice recipient rejects an invoice, the invoicing party can send a new invoice after checking the reason for rejection (AcceptanceStatus and ConfirmationDescription at Invoice and InvoiceItem level). If the invoice recipient does not respond, the invoice is generally regarded as being accepted and the invoicing party can expect payment.

FIGS. 22A-F depict a flow diagram of the steps performed by methods and systems consistent with the subject matter described herein to generate an interface from the business object model. Although described as being performed by a computer, these steps may alternatively be performed manually, or using any combination thereof. The process begins when the system receives an indication of a package template from the designer, i.e., the designer provides a package template to the system (step 2200).

Package templates specify the arrangement of packages within a business transaction document. Package templates are used to define the overall structure of the messages sent between business entities. Methods and systems consistent with the subject matter described herein use package templates in conjunction with the business object model to derive the interfaces.

The system also receives an indication of the message type from the designer (step 2202). The system selects a package from the package template (step 2204), and receives an indication from the designer whether the package is required for the interface (step 2206). If the package is not required for the interface, the system removes the package from the package template (step 2208). The system then continues this analysis for the remaining packages within the package template (step 2210).

Figure 22A:
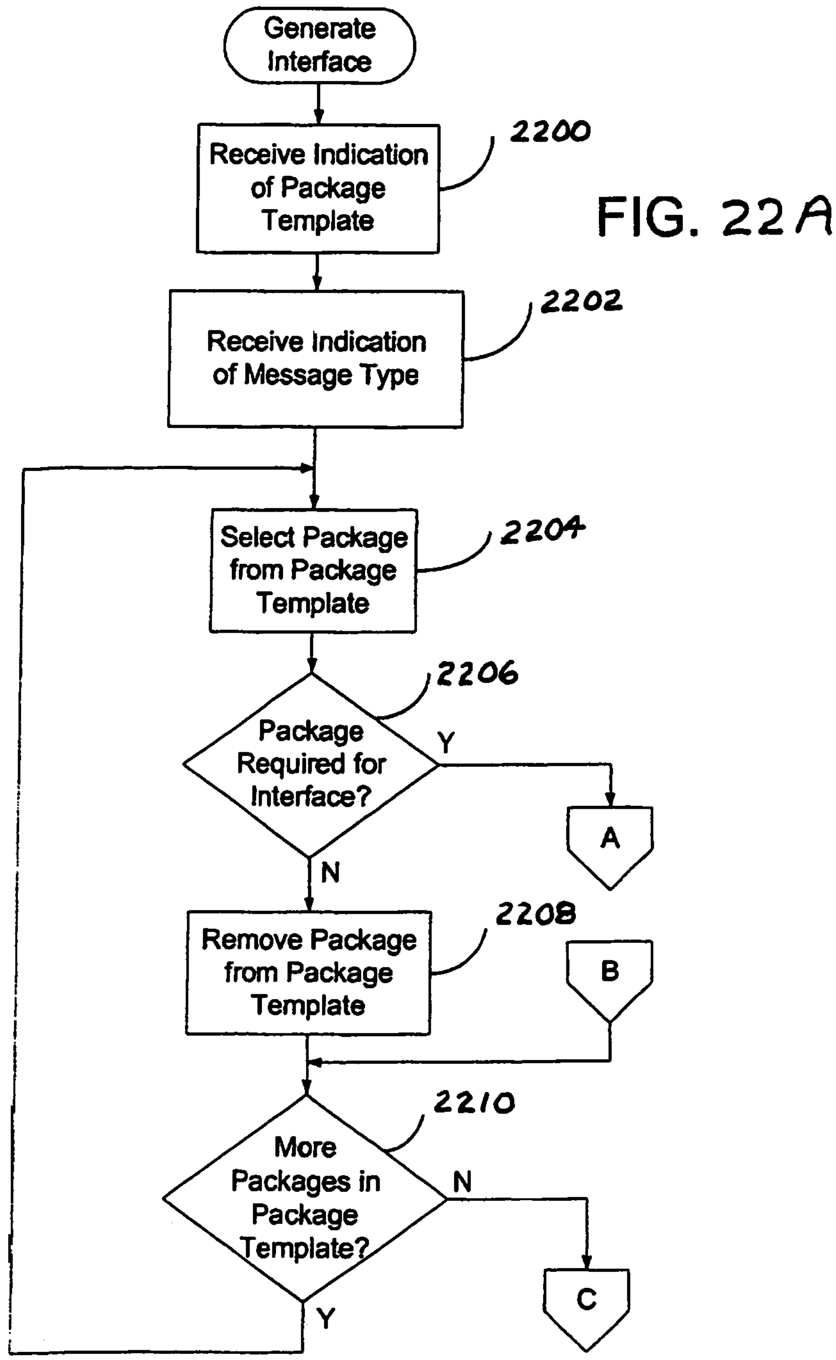
FIGS. 22A-F depict a flow diagram of the steps performed to generate an interface from the business object model in accordance with methods and systems consistent with the subject matter described herein.
Figure 22:
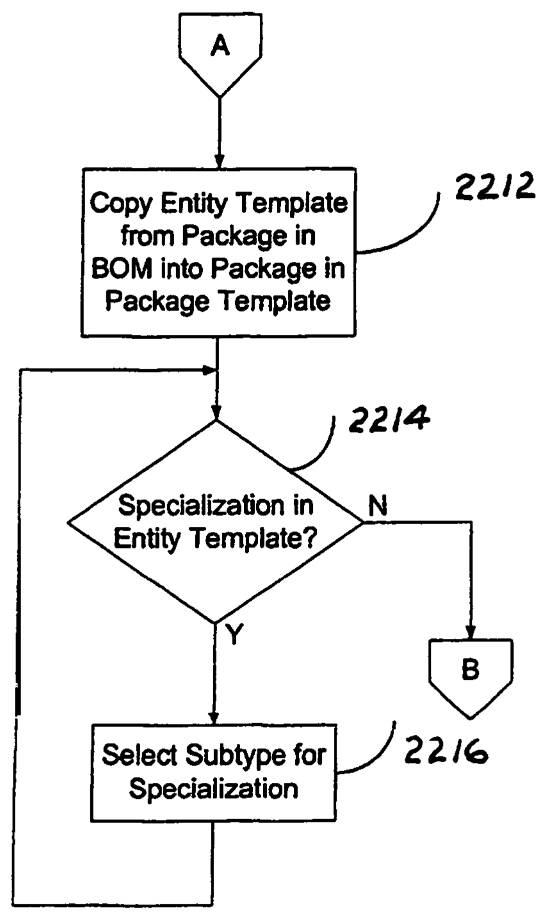
Figure 22:
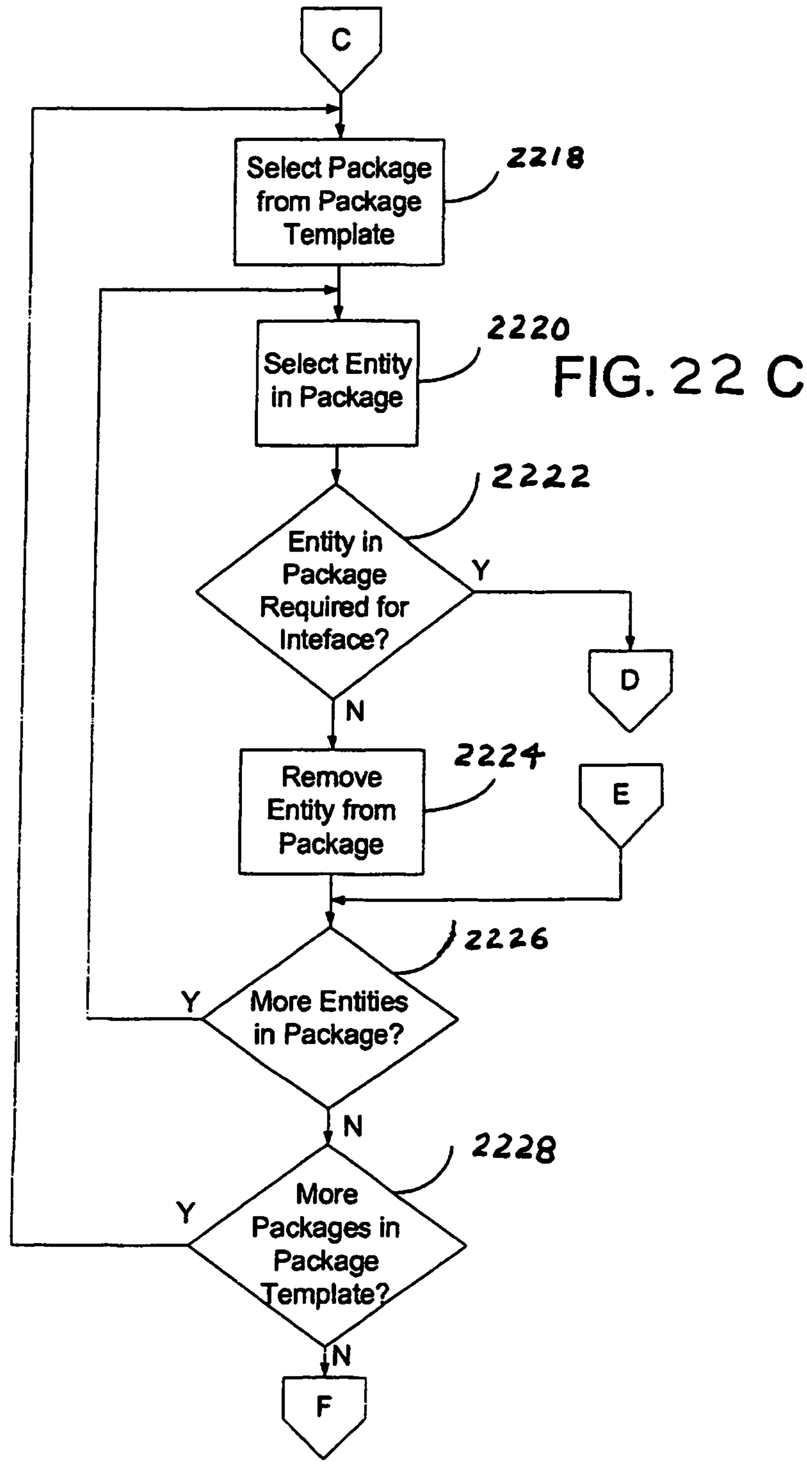
Figure 22:
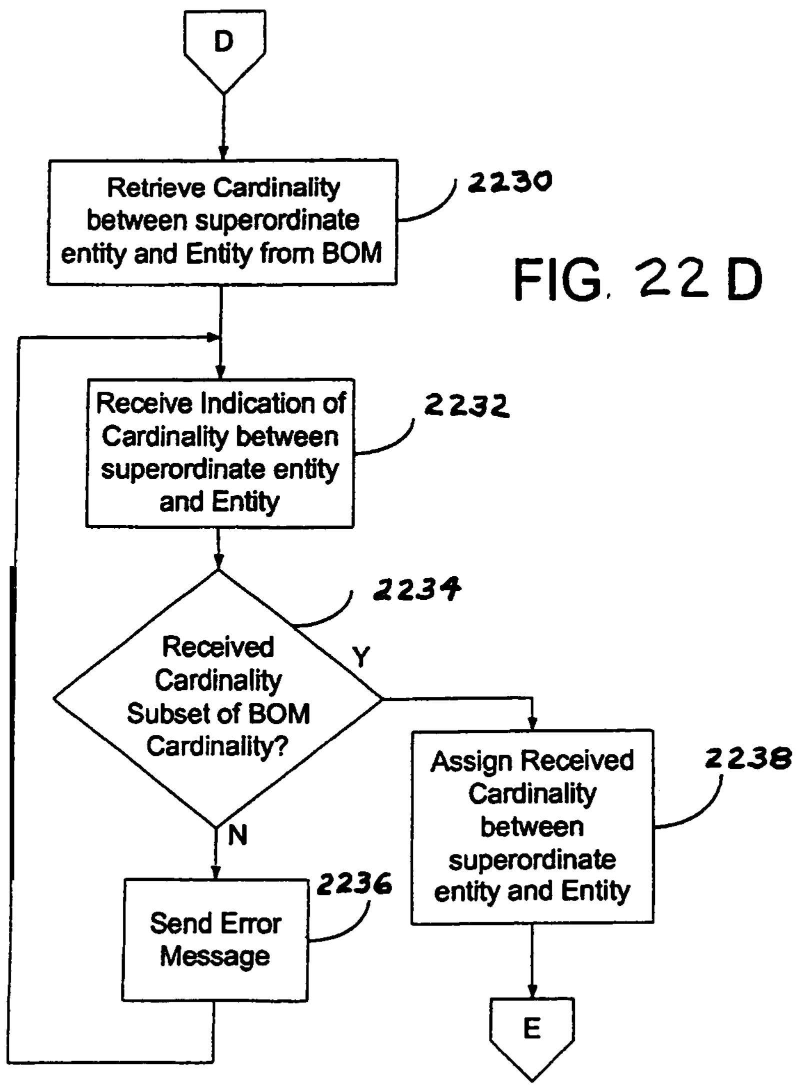
Figure 22:
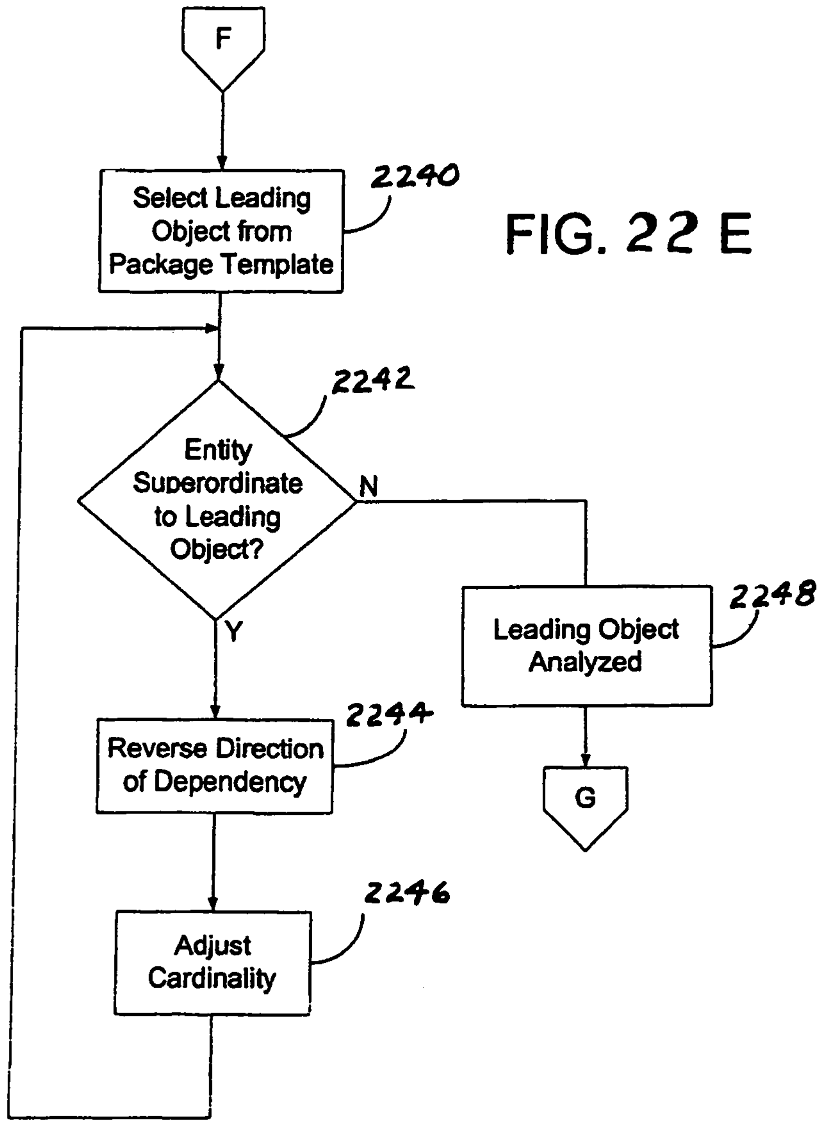
Figure 22:
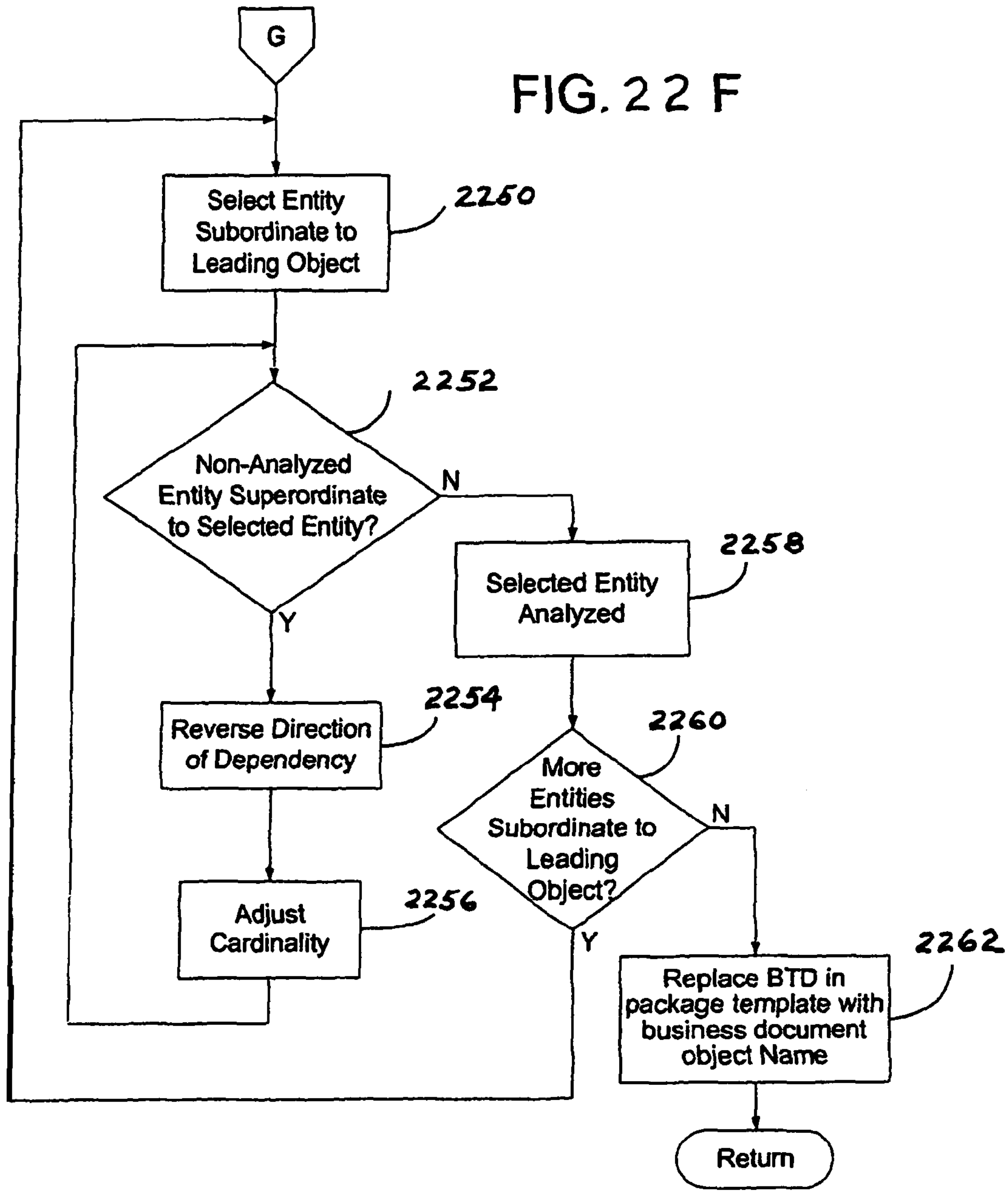

If, at step 2206, the package is required for the interface, the system copies the entity template from the package in the business object model into the package in the package template (step 2212, FIG. 22B). The system determines whether there is a specialization in the entity template (step 2214). If the system determines that there is a specialization in the entity template, the system selects a subtype for the specialization (step 2216). The system may either select the subtype for the specialization based on the message type, or it may receive this information from the designer. The system then determines whether there are any other specializations in the entity template (step 2214). When the system determines that there are no specializations in the entity template, the system continues this analysis for the remaining packages within the package template (step 2210, FIG. 22A).

At step 2210, after the system completes its analysis for the packages within the package template, the system selects one of the packages remaining in the package template (step 2218, FIG. 22C), and selects an entity from the package (step 2220). The system receives an indication from the designer whether the entity is required for the interface (step 2222). If the entity is not required for the interface, the system removes the entity from the package template (step 2224). The system then continues this analysis for the remaining entities within the package (step 2226), and for the remaining packages within the package template (step 2228).

If, at step 2222, the entity is required for the interface, the system retrieves the cardinality between a superordinate entity and the entity from the business object model (step 2230, FIG. 22D). The system also receives an indication of the cardinality between the superordinate entity and the entity from the designer (step 2232). The system then determines whether the received cardinality is a subset of the business object model cardinality (step 2234). If the received cardinality is not a subset of the business object model cardinality, the system sends an error message to the designer (step 2236). If the received cardinality is a subset of the business object model cardinality, the system assigns the received cardinality as the cardinality between the superordinate entity and the entity (step 2238). The system then continues this analysis for the remaining entities within the package (step 2226, FIG. 22C), and for the remaining packages within the package template (step 2228).

The system then selects a leading object from the package template (step 2240, FIG. 22E). The system determines whether there is an entity superordinate to the leading object (step 2242). If the system determines that there is an entity superordinate to the leading object, the system reverses the direction of the dependency (step 2244) and adjusts the cardinality between the leading object and the entity (step 2246). The system performs this analysis for entities that are superordinate to the leading object (step 2242). If the system determines that there are no entities superordinate to the leading object, the system identifies the leading object as analyzed (step 2248).

The system then selects an entity that is subordinate to the leading object (step 2250, FIG. 22F). The system determines whether any non-analyzed entities are superordinate to the selected entity (step 2252). If a non-analyzed entity is superordinate to the selected entity, the system reverses the direction of the dependency (step 2254) and adjusts the cardinality between the selected entity and the non-analyzed entity (step 2256). The system performs this analysis for non-analyzed entities that are superordinate to the selected entity (step 2252). If the system determines that there are no non-analyzed entities superordinate to the selected entity, the system identifies the selected entity as analyzed (step 2258), and continues this analysis for entities that are subordinate to the leading object (step 2260). After the packages have been analyzed, the system substitutes the BusinessTransactionDocument ("BTD") in the package template with the name of the interface (step 2262). This includes the "BTD" in the BTDItem package and the "BTD" in the BTDItemScheduleLine package.

6. Use of an Interface

The XI stores the interfaces (as an interface type). At runtime, the sending party's program instantiates the interface to create a business document, and sends the business document in a message to the recipient. The messages are preferably defined using XML. In the example depicted in FIG. 23, the Buyer 2300 uses an application 2306 in its system to instantiate an interface 2308 and create an interface object or business document object 2310. The Buyer's application 2306 uses data that is in the sender's component-specific structure and fills the business document object 2310 with the data. The Buyer's application 2306 then adds message identification 2312 to the business document and places the business document into a message 2302. The Buyer's application 2306 sends the message 2302 to the Vendor 2304. The Vendor 2304 uses an application 2314 in its system to receive the message 2302 and store the business document into its own memory. The Vendor's application 2314 unpacks the message 2302 using the corresponding interface 2316 stored in its XI to obtain the relevant data from the interface object or business document object 2318.

Figure 25:
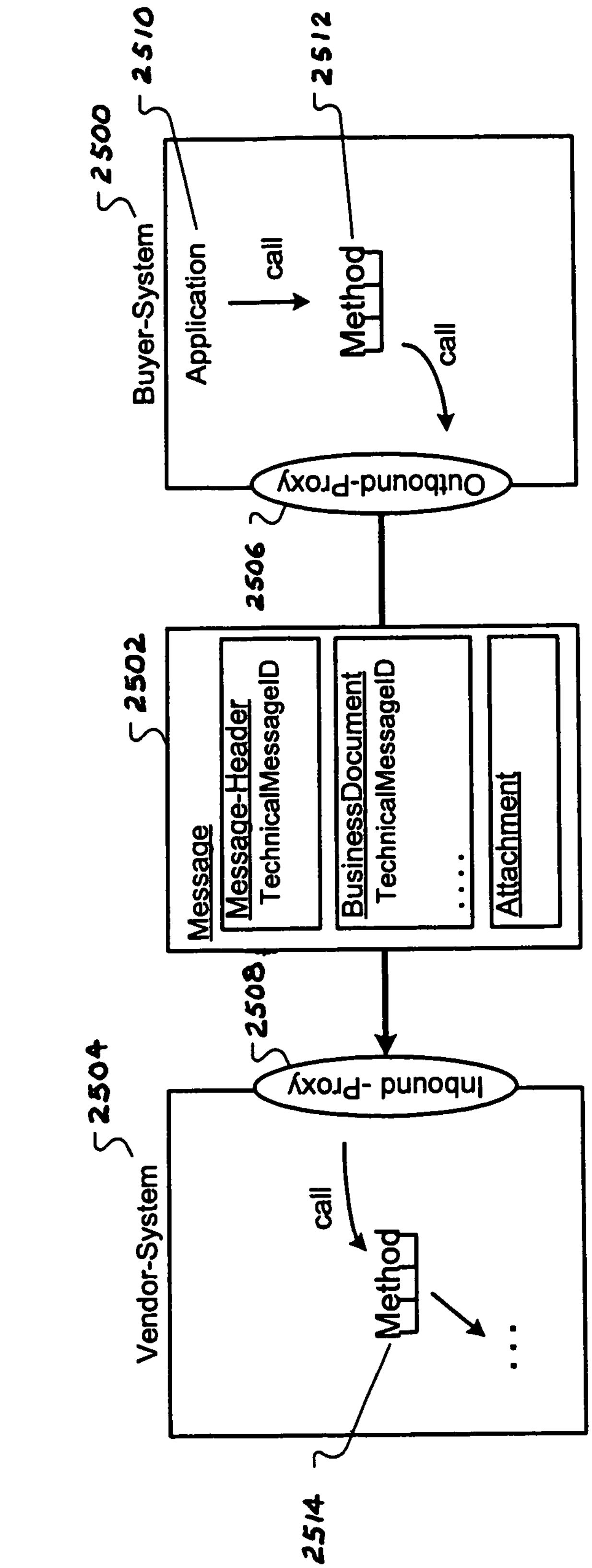
FIG. 25 depicts an example illustrating the transmittal of a message using proxies in accordance with methods and systems consistent with the subject matter described herein.

From the component's perspective, the interface is represented by an interface proxy 2400, as depicted in FIG. 24. The proxies 2400 shield the components 2402 of the sender and recipient from the technical details of sending messages 2404 via XI. In particular, as depicted in FIG. 25, at the sending end, the Buyer 2500 uses an application 2510 in its system to call an implemented method 2512, which generates the outbound proxy 2506. The outbound proxy 2506 parses the internal data structure of the components and converts them to the XML structure in accordance with the business document object. The outbound proxy 2506 packs the document into a message 2502. Transport, routing and mapping the XML message to the recipient 28304 is done by the routing system (XI, modeling environment 516, etc.).

When the message arrives, the recipient's inbound proxy 2508 calls its component-specific method 2514 for creating a document. The proxy 2508 at the receiving end downloads the data and converts the XML structure into the internal data structure of the recipient component 2504 for further processing.

Figure 26A:
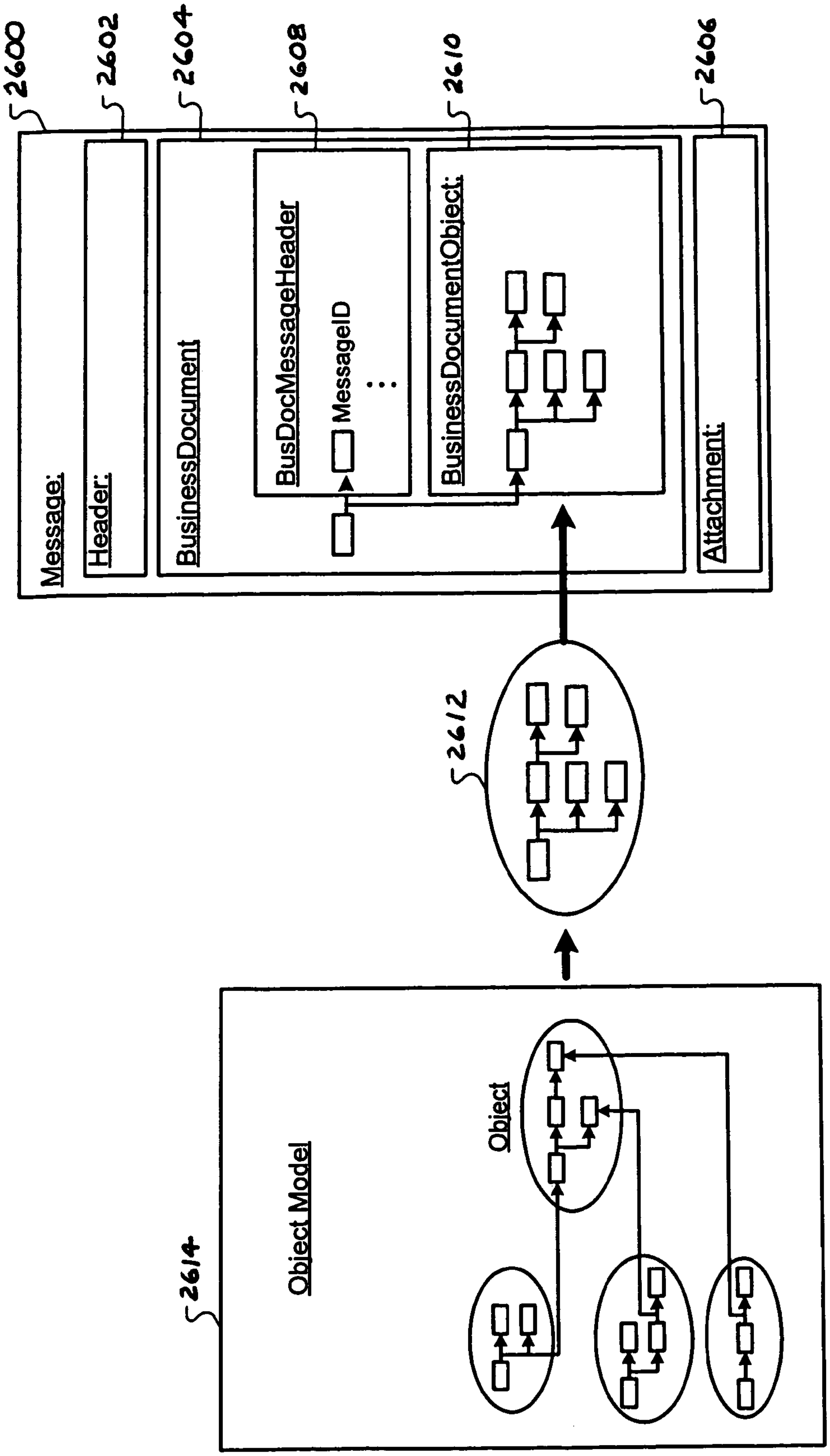
FIG. 26A depicts components of a message in accordance with methods and systems consistent with the subject matter described herein.

As depicted in FIG. 26A, a message 2600 includes a message header 2602 and a business document 2604. The message 2600 also may include an attachment 2606. For example, the sender may attach technical drawings, detailed specifications or pictures of a product to a purchase order for the product. The business document 2604 includes a business document message header 2608 and the business document object 2610. The business document message header 2608 includes administrative data, such as the message ID and a message description. As discussed above, the structure 2612 of the business document object 2610 is derived from the business object model 2614. Thus, there is a strong correlation between the structure of the business document object and the structure of the business object model. The business document object 2610 forms the core of the message 2600.

In collaborative processes as well as Q&A processes, messages should refer to documents from previous messages. A simple business document object ID or object ID is insufficient to identify individual messages uniquely because several versions of the same business document object can be sent during a transaction. A business document object ID with a version number also is insufficient because the same version of a business document object can be sent several times. Thus, messages require several identifiers during the course of a transaction.

Figure 26B:
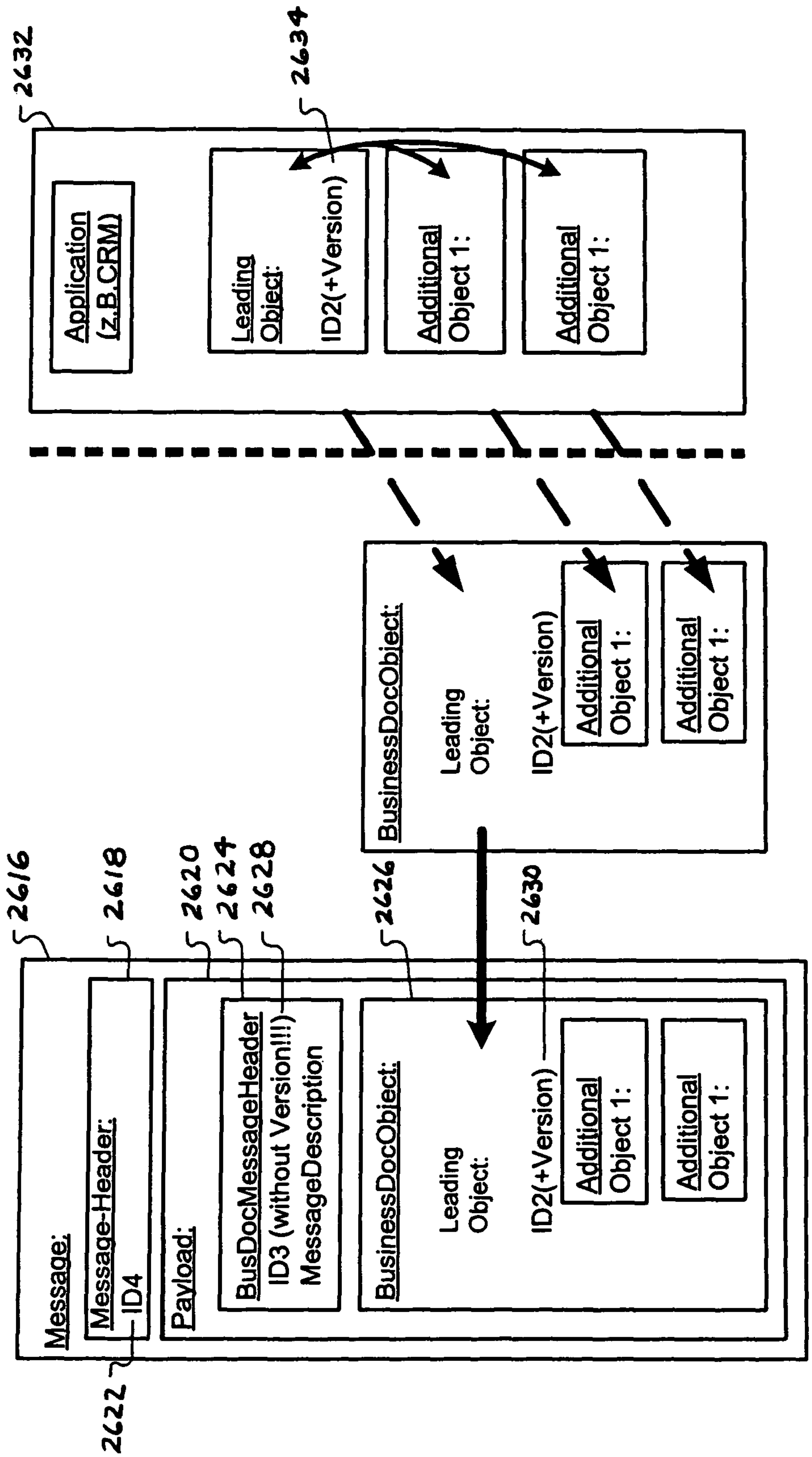
FIG. 26B depicts IDs used in a message in accordance with methods and systems consistent with the subject matter described herein.

As depicted in FIG. 26B, the message header 2618 in message 2616 includes a technical ID ("ID4") 2622 that identifies the address for a computer to route the message. The sender's system manages the technical ID 2622.

The administrative information in the business document message header 2624 of the payload or business document 2620 includes a BusinessDocumentMessageID ("ID3") 2628. The business entity or component 2632 of the business entity manages and sets the BusinessDocumentMessageID 2628. The business entity or component 2632 also can refer to other business documents using the BusinessDocumentMessageID 2628. The receiving component 2632 requires no knowledge regarding the structure of this ID. The BusinessDocumentMessageID 2628 is, as an ID, unique. Creation of a message refers to a point in time. No versioning is typically expressed by the ID. Besides the BusinessDocumentMessageID 2628, there also is a business document object ID 2630, which may include versions.

The component 2632 also adds its own component object ID 2634 when the business document object is stored in the component. The component object ID 2634 identifies the business document object when it is stored within the component. However, not all communication partners may be aware of the internal structure of the component object ID 2634. Some components also may include a versioning in their ID 2634.

7. Use of Interfaces Across Industries

Methods and systems consistent with the subject matter described herein provide interfaces that may be used across different business areas for different industries. Indeed, the interfaces derived using methods and systems consistent with the subject matter described herein may be mapped onto the interfaces of different industry standards. Unlike the interfaces provided by any given standard that do not include the interfaces required by other standards, methods and systems consistent with the subject matter described herein provide a set of consistent interfaces that correspond to the interfaces provided by different industry standards. Due to the different fields provided by each standard, the interface from one standard does not easily map onto another standard. By comparison, to map onto the different industry standards, the interfaces derived using methods and systems consistent with the subject matter described herein include most of the fields provided by the interfaces of different industry standards. Missing fields may easily be included into the business object model. Thus, by derivation, the interfaces can be extended consistently by these fields. Thus, methods and systems consistent with the subject matter described herein provide consistent interfaces that can be used across different industry standards.

Regardless of the particular hardware or software architecture used, the disclosed systems or software are generally capable of implementing business objects and deriving (or otherwise utilizing) consistent interfaces that are suitable for use across industries, across businesses, and across different departments within a business in accordance with some or all of the following description. In short, system 100 contemplates using any appropriate combination and arrangement of logical elements to implement some or all of the described functionality.

AdvertisingIssue Interfaces

Advertising Sales Order Processing is to supply to Classified Ad Sales Processing information about the issues of media publications in which advertisements are sold. Classified Ad Sales Processing usually requests this information periodically and caches it as a list of AdvertisingIssues.

Message Choreography

The message choreography of FIG. 28 describes a possible logical sequence of messages that can be used to realize an advertising issue business scenario.

An AdvertisingIssueByElementsQuery_sync is an inquiry to Advertising Sales Order Processing for AdvertisingIssues matching the given elements. The structure of the message type AdvertisingIssueByElementsQuery_sync is specified by the message data type AdvertisingIssueByElementsQueryMessage_sync.

An AdvertisingIssueByElementsResponse_sync is the response to an AdvertisingIssueByElementsQuery_sync. The structure of the message type AdvertisingIssueByElementsResponse_sync is specified by the message data type AdvertisingIssueByElementsResponseMessage_sync.

Figure 29:
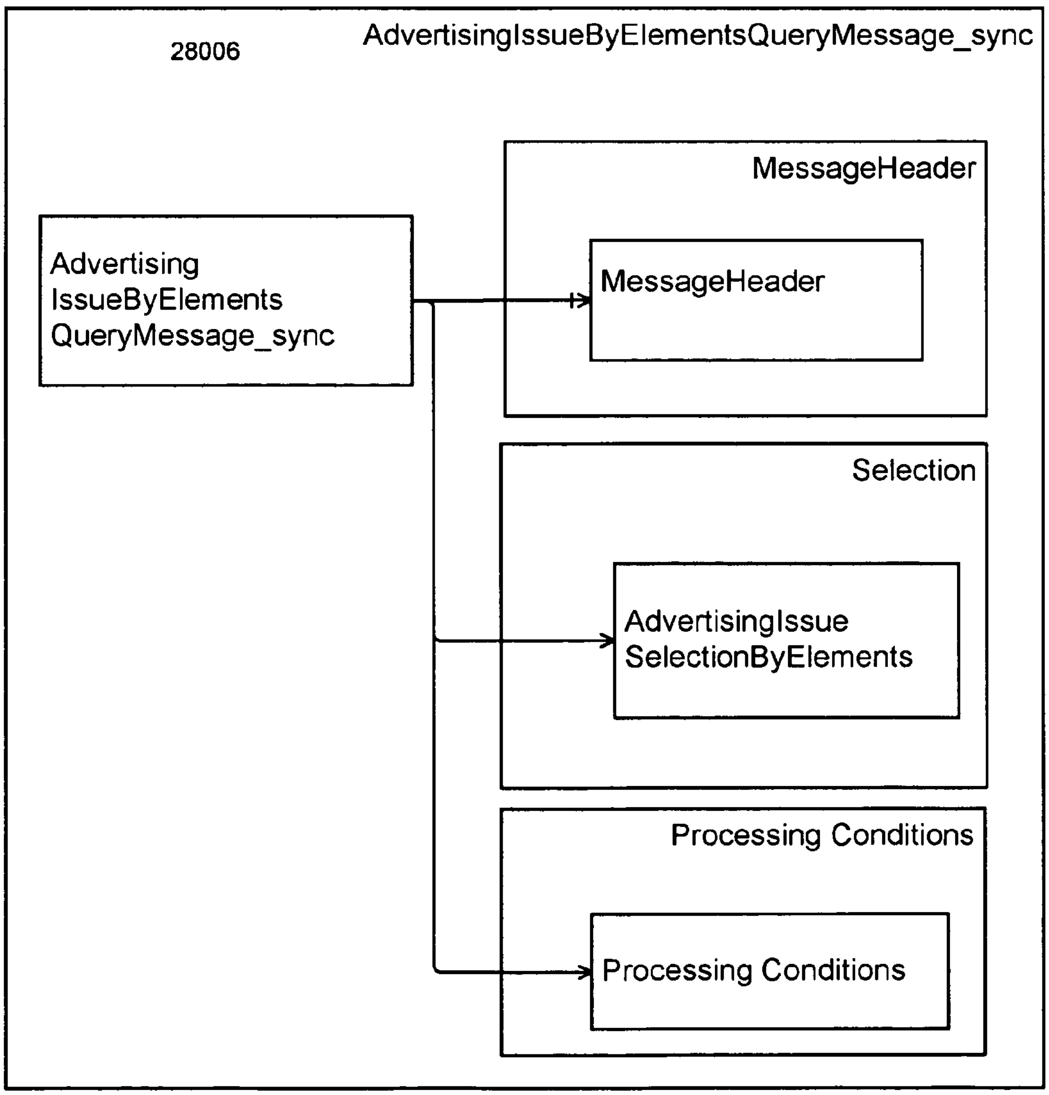
FIG. 29 shows an example AdvertisingIssueByElementsQueryMessage_sync Message Data Type.
Figure 30:
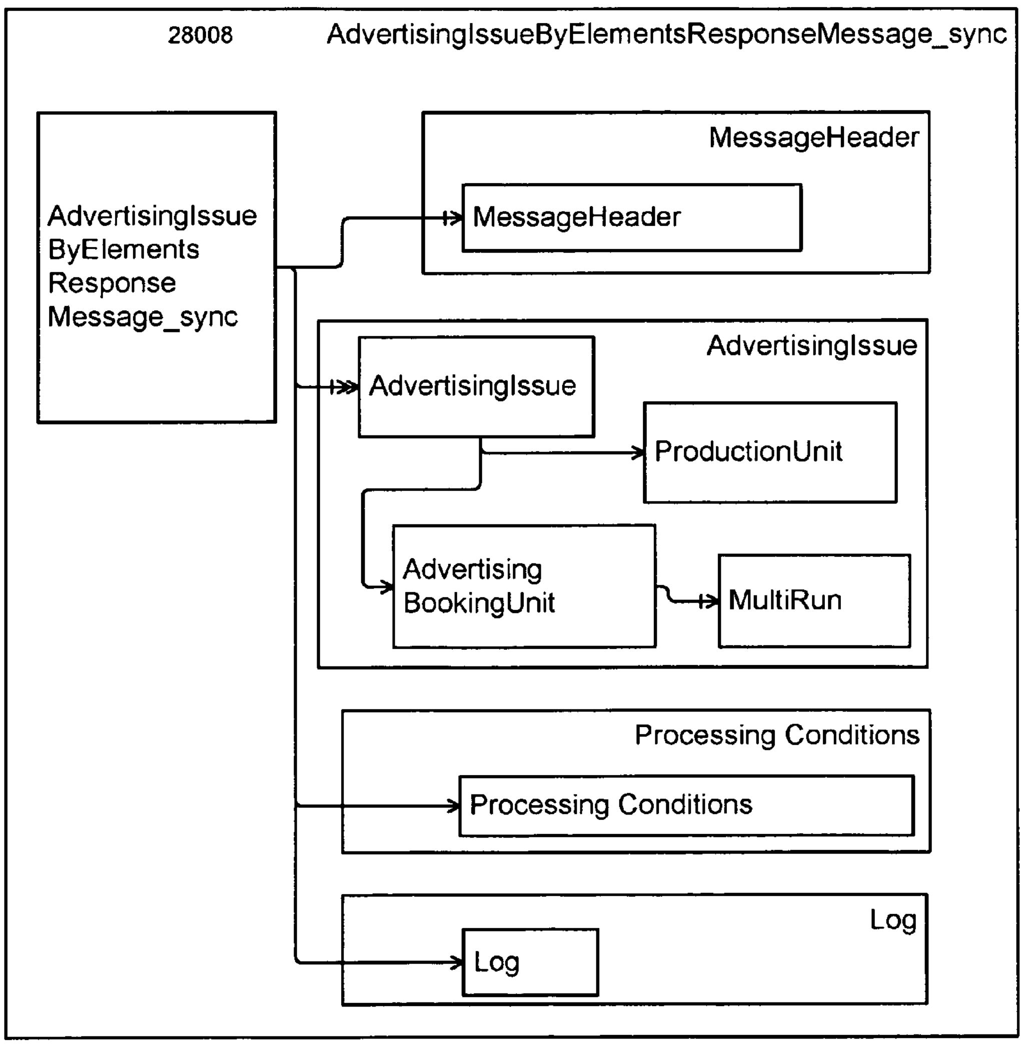
FIG. 30 shows an example AdvertisingIssueByElementsResponseMessage_sync Message Data Type.

For example, an "Advertising Sales Order Processing" system 28002 can request to query a "Classified Ad Sales Processing" system 28004 using the AdvertisingIssueByElementsQuery_sync message 28006 as shown, for example, in FIG. 29. The "Classified Ad Sales Processing" system 28004 can respond to the query using the AdvertisingIssueByElementsResponse_sync message 28008 as shown, for example, in FIG. 30.

AdvertisingIssueByElementsQuery contains the business document and the business information that is relevant for sending a business document in a message. FIGS. 31-1 through 31-9 show an AdvertisingIssueSimpleByElementsQueryMessage_sync 31000 package. The AdvertisingIssueSimpleByElementsQueryMessage_sync 31000 package is a <MessageDataType> 31004 datatype. The AdvertisingIssueSimpleByElementsQueryMessage_sync 31000 package includes an AdvertisingIssueSimpleByElementsQuery_sync 31002 entity. The AdvertisingIssueSimpleByElementsQueryMessage_sync 31000 package includes various packages, namely MessageHeader 31006, Selection 31014 and ProcessingConditions 31160.

The MessageHeader 31006 package is a BasicBusinessDocumentMessageHeader 31012 datatype. The MessageHeader 31006 package includes a MessageHeader 31008 entity.

The MessageHeader 31008 entity has a cardinality of zero or one 31010 meaning that for each instance of the AdvertisingIssueSimpleByElementsQuery_sync 31002 entity there may be one MessageHeader 31008 entity.

The Selection 31014 package includes an AdvertisingIssueSimpleSelectionByElements 31016 entity.

The AdvertisingIssueSimpleSelectionByElements 31016 entity has a cardinality of one 31018 meaning that for each instance of the AdvertisingIssueSimpleByElementsQuery_sync 31002 entity there is one AdvertisingIssueSimpleSelectionByElements 31016 entity. The AdvertisingIssueSimpleSelectionByElements 31016 entity has various subordinate entities, namely SelectionByAdvertisingBookingUnitID 31020, SelectionByProductionUnitAdvertisingContentComponentID 31048, SelectionByAdvertisingBookingUnitAdvertisingMultiRunCode 31076, SelectionByProductionUnitMediaPublicationIssueDate 31104 and SelectionByProductionUnitMediaPublicationIssueID 31132.

The SelectionByAdvertisingBookingUnitID 31020 entity has a cardinality of zero or n 31022 meaning that for each instance of the AdvertisingIssueSimpleSelectionByElements 31016 entity there may be one or more SelectionByAdvertisingBookingUnitID 31020 entities. The SelectionByAdvertisingBookingUnitID 31020 entity includes various attributes, namely InclusionExclusionCode 31024, IntervalBoundaryTypeCode 31030, LowerBoundaryAdvertisingBookingUnitID 31036 and UpperBoundaryAdvertisingBookingUnitID 31042.

The InclusionExclusionCode 31024 attribute is an InclusionExclusionCode 31028 datatype. The InclusionExclusionCode 31024 attribute has a cardinality of one 31026 meaning that for each instance of the SelectionByAdvertisingBookingUnitID 31020 entity there is one InclusionExclusionCode 31024 attribute.

The IntervalBoundaryTypeCode 31030 attribute is an IntervalBoundaryTypeCode 31034 datatype. The IntervalBoundaryTypeCode 31030 attribute has a cardinality of one 31032 meaning that for each instance of the SelectionByAdvertisingBookingUnitID 31020 entity there is one IntervalBoundaryTypeCode 31030 attribute.

The LowerBoundaryAdvertisingBookingUnitID 31036 attribute is an AdvertisingBookingUnitID 31040 datatype. The LowerBoundaryAdvertisingBookingUnitID 31036 attribute has a cardinality of one 31038 meaning that for each instance of the SelectionByAdvertisingBookingUnitID 31020 entity there is one LowerBoundaryAdvertisingBookingUnitID 31036 attribute.

The UpperBoundaryAdvertisingBookingUnitID 31042 attribute is an AdvertisingBookingUnitID 31046 datatype. The UpperBoundaryAdvertisingBookingUnitID 31042 attribute has a cardinality of zero or one 31044 meaning that for each instance of the SelectionByAdvertisingBookingUnitID 31020 entity there may be one UpperBoundaryAdvertisingBookingUnitID 31042 attribute.

The SelectionByProductionUnitAdvertisingContentComponentID 31048 entity has a cardinality of zero or n 31050 meaning that for each instance of the AdvertisingIssueSimpleSelectionByElements 31016 entity there may be one or more SelectionByProductionUnitAdvertisingContentComponentID 31048 entities. The SelectionByProductionUnitAdvertisingContentComponentID 31048 entity includes various attributes, namely InclusionExclusionCode 31052, IntervalBoundaryTypeCode 31058, LowerBoundaryProductionUnitAdvertisingContentComponentID 31064 and UpperBoundaryProductionUnitAdvertisingContentComponentID 31070.

The InclusionExclusionCode 31052 attribute is an InclusionExclusionCode 31056 datatype. The InclusionExclusionCode 31052 attribute has a cardinality of one 31054 meaning that for each instance of the SelectionByProductionUnitAdvertisingContentComponentID 31048 entity there is one InclusionExclusionCode 31052 attribute.

The IntervalBoundaryTypeCode 31058 attribute is an IntervalBoundaryTypeCode 31062 datatype. The IntervalBoundaryTypeCode 31058 attribute has a cardinality of one 31060 meaning that for each instance of the SelectionByProductionUnitAdvertisingContentComponentID 31048 entity there is one IntervalBoundaryTypeCode 31058 attribute.

The LowerBoundaryProductionUnitAdvertisingContentComponentID 31064 attribute is an AdvertisingContentComponentID 31068 datatype. The LowerBoundaryProductionUnitAdvertisingContentComponentID 31064 attribute has a cardinality of one 31066 meaning that for each instance of the SelectionByProductionUnitAdvertisingContentComponentID 31048 entity there is one LowerBoundaryProductionUnitAdvertisingContentComponentID 31064 attribute.

The UpperBoundaryProductionUnitAdvertisingContentComponentID 31070 attribute is an AdvertisingContentComponentID 31074 datatype. The UpperBoundaryProductionUnitAdvertisingContentComponentID 31070 attribute has a cardinality of zero or one 31072 meaning that for each instance of the SelectionByProductionUnitAdvertisingContentComponentID 31048 entity there may be one UpperBoundaryProductionUnitAdvertisingContentComponentID 31070 attribute.

The SelectionByAdvertisingBookingUnitAdvertisingMultiRunCode 31076 entity has a cardinality of zero or n 31078 meaning that for each instance of the AdvertisingIssueSimpleSelectionByElements 31016 entity there may be one or more SelectionByAdvertisingBookingUnitAdvertisingMultiRunCode 31076 entities. The SelectionByAdvertisingBookingUnitAdvertisingMultiRunCode 31076 entity includes various attributes, namely InclusionExclusionCode 31080, IntervalBoundaryTypeCode 31086, LowerBoundaryAdvertisingBookingUnitAdvertisingMultiRunCode 31092 and UpperBoundaryAdvertisingBookingUnitAdvertisingMultiRunCode 31098.

The InclusionExclusionCode 31080 attribute is an InclusionExclusionCode 31084 datatype. The InclusionExclusionCode 31080 attribute has a cardinality of one 31082 meaning that for each instance of the SelectionByAdvertisingBookingUnitAdvertisingMultiRunCode 31076 entity there is one InclusionExclusionCode 31080 attribute.

The IntervalBoundaryTypeCode 31086 attribute is an IntervalBoundaryTypeCode 31090 datatype. The IntervalBoundaryTypeCode 31086 attribute has a cardinality of one 31088 meaning that for each instance of the SelectionByAdvertisingBookingUnitAdvertisingMultiRunCode 31076 entity there is one IntervalBoundaryTypeCode 31086 attribute.

The LowerBoundaryAdvertisingBookingUnitAdvertisingMultiRunCode 31092 attribute is an AdvertisingMultiRunCode 31096 datatype. The LowerBoundaryAdvertisingBookingUnitAdvertisingMultiRunCode 31092 attribute has a cardinality of one 31094 meaning that for each instance of the SelectionByAdvertisingBookingUnitAdvertisingMultiRunCode 31076 entity there is one LowerBoundaryAdvertisingBookingUnitAdvertisingMultiRunCode 31092 attribute.

The UpperBoundaryAdvertisingBookingUnitAdvertisingMultiRunCode 31098 attribute is an AdvertisingMultiRunCode 31102 datatype. The UpperBoundaryAdvertisingBookingUnitAdvertisingMultiRunCode 31098 attribute has a cardinality of zero or one 31100 meaning that for each instance of the SelectionByAdvertisingBookingUnitAdvertisingMultiRunCode 31076 entity there may be one UpperBoundaryAdvertisingBookingUnitAdvertisingMultiRunCode 31098 attribute.

The SelectionByProductionUnitMediaPublicationIssueDate 31104 entity has a cardinality of zero or n 31106 meaning that for each instance of the AdvertisingIssueSimpleSelectionByElements 31016 entity there may be one or more SelectionByProductionUnitMediaPublicationIssueDate 31104 entities. The SelectionByProductionUnitMediaPublicationIssueDate 31104 entity includes various attributes, namely InclusionExclusionCode 31108, IntervalBoundaryTypeCode 31114, LowerBoundaryProductionUnitMediaPublicationIssueDate 31120 and UpperBoundaryProductionUnitMediaPublicationIssueDate 31126.

The InclusionExclusionCode 31108 attribute is an InclusionExclusionCode 31112 datatype. The InclusionExclusionCode 31108 attribute has a cardinality of one 31110 meaning that for each instance of the SelectionByProductionUnitMediaPublicationIssueDate 31104 entity there is one InclusionExclusionCode 31108 attribute.

The IntervalBoundaryTypeCode 31114 attribute is an IntervalBoundaryTypeCode 31118 datatype. The IntervalBoundaryTypeCode 31114 attribute has a cardinality of one 31116 meaning that for each instance of the SelectionByProductionUnitMediaPublicationIssueDate 31104 entity there is one IntervalBoundaryTypeCode 31114 attribute.

The LowerBoundaryProductionUnitMediaPublicationIssueDate 31120 attribute is a MediaPublication.IssueDate 31124 datatype. The LowerBoundaryProductionUnitMediaPublicationIssueDate 31120 attribute has a cardinality of one 31122 meaning that for each instance of the SelectionByProductionUnitMediaPublicationIssueDate 31104 entity there is one LowerBoundaryProductionUnitMediaPublicationIssueDate 31120 attribute.

The UpperBoundaryProductionUnitMediaPublicationIssueDate 31126 attribute is a MediaPublication.IssueDate 31130 datatype. The UpperBoundaryProductionUnitMediaPublicationIssueDate 31126 attribute has a cardinality of zero or one 31128 meaning that for each instance of the SelectionByProductionUnitMediaPublicationIssueDate 31104 entity there may be one UpperBoundaryProductionUnitMediaPublicationIssueDate 31126 attribute.

The SelectionByProductionUnitMediaPublicationIssueID 31132 entity has a cardinality of zero or n 31134 meaning that for each instance of the AdvertisingIssueSimpleSelectionByElements 31016 entity there may be one or more SelectionByProductionUnitMediaPublicationIssueID 31132 entities. The SelectionByProductionUnitMediaPublicationIssueID 31132 entity includes various attributes, namely InclusionExclusionCode 31136, IntervalBoundaryTypeCode 31142, LowerBoundaryProductionUnitMediaPublicationIssueID 31148 and UpperBoundaryProductionUnitMediaPublicationIssueID 31154.

The InclusionExclusionCode 31136 attribute is an InclusionExclusionCode 31140 datatype. The InclusionExclusionCode 31136 attribute has a cardinality of one 31138 meaning that for each instance of the SelectionByProductionUnitMediaPublicationIssueID 31132 entity there is one InclusionExclusionCode 31136 attribute.

The IntervalBoundaryTypeCode 31142 attribute is an IntervalBoundaryTypeCode 31146 datatype. The IntervalBoundaryTypeCode 31142 attribute has a cardinality of one 31144 meaning that for each instance of the SelectionByProductionUnitMediaPublicationIssueID 31132 entity there is one IntervalBoundaryTypeCode 31142 attribute.

The LowerBoundaryProductionUnitMediaPublicationIssueID 31148 attribute is a MediaPublicationIssueID 31152 datatype. The LowerBoundaryProductionUnitMediaPublicationIssueID 31148 attribute has a cardinality of one 31150 meaning that for each instance of the SelectionByProductionUnitMediaPublicationIssueID 31132 entity there is one LowerBoundaryProductionUnitMediaPublicationIssueID 31148 attribute.

The UpperBoundaryProductionUnitMediaPublicationIssueID 31154 attribute is a MediaPublicationIssueID 31158 datatype. The UpperBoundaryProductionUnitMediaPublicationIssueID 31154 attribute has a cardinality of zero or one 31156 meaning that for each instance of the SelectionByProductionUnitMediaPublicationIssueID 31132 entity there may be one UpperBoundaryProductionUnitMediaPublicationIssueID 31154 attribute.

The ProcessingConditions 31160 package includes a ProcessingConditions 31162 entity.

The ProcessingConditions 31162 entity has a cardinality of one 31164 meaning that for each instance of the AdvertisingIssueSimpleByElementsQuery_sync 31002 entity there is one ProcessingConditions 31162 entity. The ProcessingConditions 31162 entity includes various attributes, namely QueryHitsMaximumNumberValue 31166 and UnlimitedQueryHitsIndicator 31172.

The QueryHitsMaximumNumberValue 31166 attribute is a QueryHits.Maximum.NumberValue 31170 datatype. The QueryHitsMaximumNumberValue 31166 attribute has a cardinality of zero or one 31168 meaning that for each instance of the ProcessingConditions 31162 entity there may be one QueryHitsMaximumNumberValue 31166 attribute.

The UnlimitedQueryHitsIndicator 31172 attribute is an UnlimitedQueryHits.Indicator 31176 datatype. The UnlimitedQueryHitsIndicator 31172 attribute has a cardinality of zero or one 31174 meaning that for each instance of the ProcessingConditions 31162 entity there may be one UnlimitedQueryHitsIndicator 31172 attribute.

Message Header Package

The MessageHeader package groups the business information that is relevant for sending a business document in a message. It includes an optional entity MessageHeader.

MessageHeader

The MessageHeader includes the information to identify a business document in a message from the perspective of the sending application. The BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

AdvertisingIssue

An AdvertisingIssue is a portion of an issue of a MediaPublicationEdition (e.g., a regional edition of a newspaper) in which advertisers place their advertisements. Advertisers can buy a certain instance of the AdvertisingBookingUnit, in a certain AdvertisingContentComponent, or in one particular issue or in two or more issues which form one recurrence of the MultiRun patterns in the AdvertisingBookingUnit. The AdvertisingBookingUnit may be sold as a combination of others for one price. Some instances of the AdvertisingBookingUnit are called combo booking units, others are called basic booking units. Advertisers will then generally place their advertisement at once in several instances of the AdvertisingIssue which differ in their basic AdvertisingBookingUnit (if a combo of the AdvertisingBookingUnit is bought) and in the date of their issue (if the MultiRun is bought).

AdvertisingBookingUnit

The AdvertisingIssueAdvertisingBookingUnit is a reference to the AdvertisingBookingUnit which the advertiser buys. The AdvertisingBookingUnit is a (regularly published) MediaPublicationEdition (e.g., a regional edition of a newspaper) reaching a certain target group of consumers who can be the recipients of paid-for advertising. Advertisers choose the AdvertisingBookingUnit in which their advertisements shall be placed. The AdvertisingIssueAdvertisingBookingUnit is subdivided into one optional instance of the MultiRun. It also includes an ID element, and a Name element. ID refers to the unique identifier of the AdvertisingBookingUnit which the advertiser buys. It is either equal to the basic booking unit of the AdvertisingIssueProductionUnit or is a combo booking unit which includes it. Name refers to a name for the AdvertisingBookingUnit identified by ID.

ProductionUnit

The AdvertisingIssueProductionUnit is a reference to the AdvertisingBookingUnitContentComponent ProductionUnit in which the advertisement is placed. An AdvertisingBookingUnitContentComponent ProductionUnit is a portion of an issue of a MediaPublicationEdition (e.g., a regional edition of a newspaper) which is reserved to contain paid-for advertising. It can exist for basic AdvertisingBookingUnits and is a combination of the AdvertisingBookingUnitContentComponent and, in the case of a regular MediaPublication, a particular issue (specified by a date or an issue number) in which advertising is sold. An AdvertisingContentComponent is a part of a (regularly published) MediaPublicationEdition (e.g., a regional edition of a newspaper) which serves as context for paid-for advertising. Advertisers choose the AdvertisingContentComponent in which their advertisements shall be placed.

Log

A log is a sequence of messages that may result from the execution of an application task.

FIGS. 32-1 through 32-5 show an AdvertisingIssueSimpleByElementsResponseMessage_sync 32000 package. The AdvertisingIssueSimpleByElementsResponseMessage_sync 32000 package is an AdvertisingIssueSimpleByElementsResponse_sync 32004 datatype. The AdvertisingIssueSimpleByElementsResponseMessage_sync 32000 package includes an AdvertisingIssueSimpleByElementsResponse_sync 32002 entity. The AdvertisingIssueSimpleByElementsResponseMessage_sync 32000 package includes various packages, namely MessageHeader 32006, AdvertisingIssue 32014, ProcessingConditions 32104 and Log 32122.

The MessageHeader 32006 package is a BasicBusinessDocumentMessageHeader 32012 datatype. The MessageHeader 32006 package includes a MessageHeader 32008 entity.

The MessageHeader 32008 entity has a cardinality of zero or one 32010 meaning that for each instance of the AdvertisingIssueSimpleByElementsResponse_sync 32002 entity there may be one MessageHeader 32008 entity.

The AdvertisingIssue 32014 package includes an AdvertisingIssue 32016 entity.

The AdvertisingIssue 32016 entity has a cardinality of zero or n 32018 meaning that for each instance of the AdvertisingIssueSimpleByElementsResponse_sync 32002 entity there may be one or more AdvertisingIssue 32016 entities. The AdvertisingIssue 32016 entity includes an ID 32020 attribute. The AdvertisingIssue 32016 entity has various subordinate entities, namely AdvertisingBookingUnit 32026 and ProductionUnit 32064.

The ID 32020 attribute is an AdvertisingIssueID 32024 datatype. The ID 32020 attribute has a cardinality of one 32022 meaning that for each instance of the AdvertisingIssue 32016 entity there is one ID 32020 attribute.

The AdvertisingBookingUnit 32026 entity has a cardinality of one 32028 meaning that for each instance of the AdvertisingIssue 32016 entity there is one AdvertisingBookingUnit 32026 entity. The AdvertisingBookingUnit 32026 entity includes various attributes, namely ID 32030 and Name 32036. The AdvertisingBookingUnit 32026 entity includes a MultiRun 32042 subordinate entity.

The ID 32030 attribute is an AdvertisingBookingUnitID 32034 datatype. The ID 32030 attribute has a cardinality of one 32032 meaning that for each instance of the AdvertisingBookingUnit 32026 entity there is one ID 32030 attribute.

The Name 32036 attribute is an AdvertisingBookingUnit.Name 32040 datatype. The Name 32036 attribute has a cardinality of one 32038 meaning that for each instance of the AdvertisingBookingUnit 32026 entity there is one Name 32036 attribute.

The MultiRun 32042 entity has a cardinality of zero or one 32044 meaning that for each instance of the AdvertisingBookingUnit 32026 entity there may be one MultiRun 32042 entity. The MultiRun 32042 entity includes various attributes, namely AdvertisingIssueGroupID 32046, AdvertisingMultiRunCode 32052 and AdvertisingMultiRunName 32058.

The AdvertisingIssueGroupID 32046 attribute is a MultiRunAdvertisingIssueGroupID 32050 datatype. The AdvertisingIssueGroupID 32046 attribute has a cardinality of one 32048 meaning that for each instance of the MultiRun 32042 entity there is one AdvertisingIssueGroupID 32046 attribute.

The AdvertisingMultiRunCode 32052 attribute is an AdvertisingMultiRunCode 32056 datatype. The AdvertisingMultiRunCode 32052 attribute has a cardinality of one 32054 meaning that for each instance of the MultiRun 32042 entity there is one AdvertisingMultiRunCode 32052 attribute.

The AdvertisingMultiRunName 32058 attribute is an AdvertisingMultiRun.Name 32062 datatype. The AdvertisingMultiRunName 32058 attribute has a cardinality of one 32060 meaning that for each instance of the MultiRun 32042 entity there is one AdvertisingMultiRunName 32058 attribute.

The ProductionUnit 32064 entity has a cardinality of one 32066 meaning that for each instance of the AdvertisingIssue 32016 entity there is one ProductionUnit 32064 entity. The ProductionUnit 32064 entity includes various attributes, namely AdvertisingBookingUnitID 32068, AdvertisingContentComponentID 32074, MediaPublicationIssueID 32080, MediaPublicationIssueDate 32086, AdvertisingBookingUnitName 32092 and AdvertisingContentComponentName 32098.

The AdvertisingBookingUnitID 32068 attribute is an AdvertisingBookingUnitID 32072 datatype. The AdvertisingBookingUnitID 32068 attribute has a cardinality of one 32070 meaning that for each instance of the ProductionUnit 32064 entity there is one AdvertisingBookingUnitID 32068 attribute.

The AdvertisingContentComponentID 32074 attribute is an AdvertisingContentComponentID 32078 datatype. The AdvertisingContentComponentID 32074 attribute has a cardinality of one 32076 meaning that for each instance of the ProductionUnit 32064 entity there is one AdvertisingContentComponentID 32074 attribute.

The MediaPublicationIssueID 32080 attribute is a MediaPublicationIssueID 32084 datatype. The MediaPublicationIssueID 32080 attribute has a cardinality of zero or one 32082 meaning that for each instance of the ProductionUnit 32064 entity there may be one MediaPublicationIssueID 32080 attribute.

The MediaPublicationIssueDate 32086 attribute is a MediaPublication.IssueDate 32090 datatype. The MediaPublicationIssueDate 32086 attribute has a cardinality of one 32088 meaning that for each instance of the ProductionUnit 32064 entity there is one MediaPublicationIssueDate 32086 attribute.

The AdvertisingBookingUnitName 32092 attribute is an AdvertisingBookingUnit.Name 32096 datatype. The AdvertisingBookingUnitName 32092 attribute has a cardinality of one 32094 meaning that for each instance of the ProductionUnit 32064 entity there is one AdvertisingBookingUnitName 32092 attribute.

The AdvertisingContentComponentName 32098 attribute is an AdvertisingContentComponent.Name 32102 datatype. The AdvertisingContentComponentName 32098 attribute has a cardinality of one 32100 meaning that for each instance of the ProductionUnit 32064 entity there is one AdvertisingContentComponentName 32098 attribute.

The ProcessingConditions 32104 package includes a ProcessingConditions 32106 entity.

The ProcessingConditions 32106 entity has a cardinality of one 32108 meaning that for each instance of the AdvertisingIssueSimpleByElementsResponse_sync 32002 entity there is one ProcessingConditions 32106 entity. The ProcessingConditions 32106 entity includes various attributes, namely ReturnedQueryHitsNumberValue 32110 and MoreElementsAvailableIndicator 32116.

The ReturnedQueryHitsNumberValue 32110 attribute is a ReturnedQueryHits.NumberValue 32114 datatype. The ReturnedQueryHitsNumberValue 32110 attribute has a cardinality of one 32112 meaning that for each instance of the ProcessingConditions 32106 entity there is one ReturnedQueryHitsNumberValue 32110 attribute.

The MoreElementsAvailableIndicator 32116 attribute is a MoreElementsAvailable.Indicator 32120 datatype. The MoreElementsAvailableIndicator 32116 attribute has a cardinality of one 32118 meaning that for each instance of the ProcessingConditions 32106 entity there is one MoreElementsAvailableIndicator 32116 attribute.

The Log 32122 package is a Log 32128 datatype. The Log 32122 package includes a Log 32124 entity.

The Log 32124 entity has a cardinality of one 32126 meaning that for each instance of the AdvertisingIssueSimpleByElementsResponse_sync 32002 entity there is one Log 32124 entity.

AppropriateRequest

Various users are applying for investments. Each investment idea is represented by an AppropriationRequest which is assigned to an approver. A Proposed Investment scenario provides the possibility for such an approver to: visualize the whole AppropriationRequest portfolio he has to approve; gather detailed information about each AppropriationRequest he may approve, reject or postpone, including plan values and long texts; and get contextual information from the Programme the AppropriationRequest is assigned to.

Message Choreography

Figure 33:
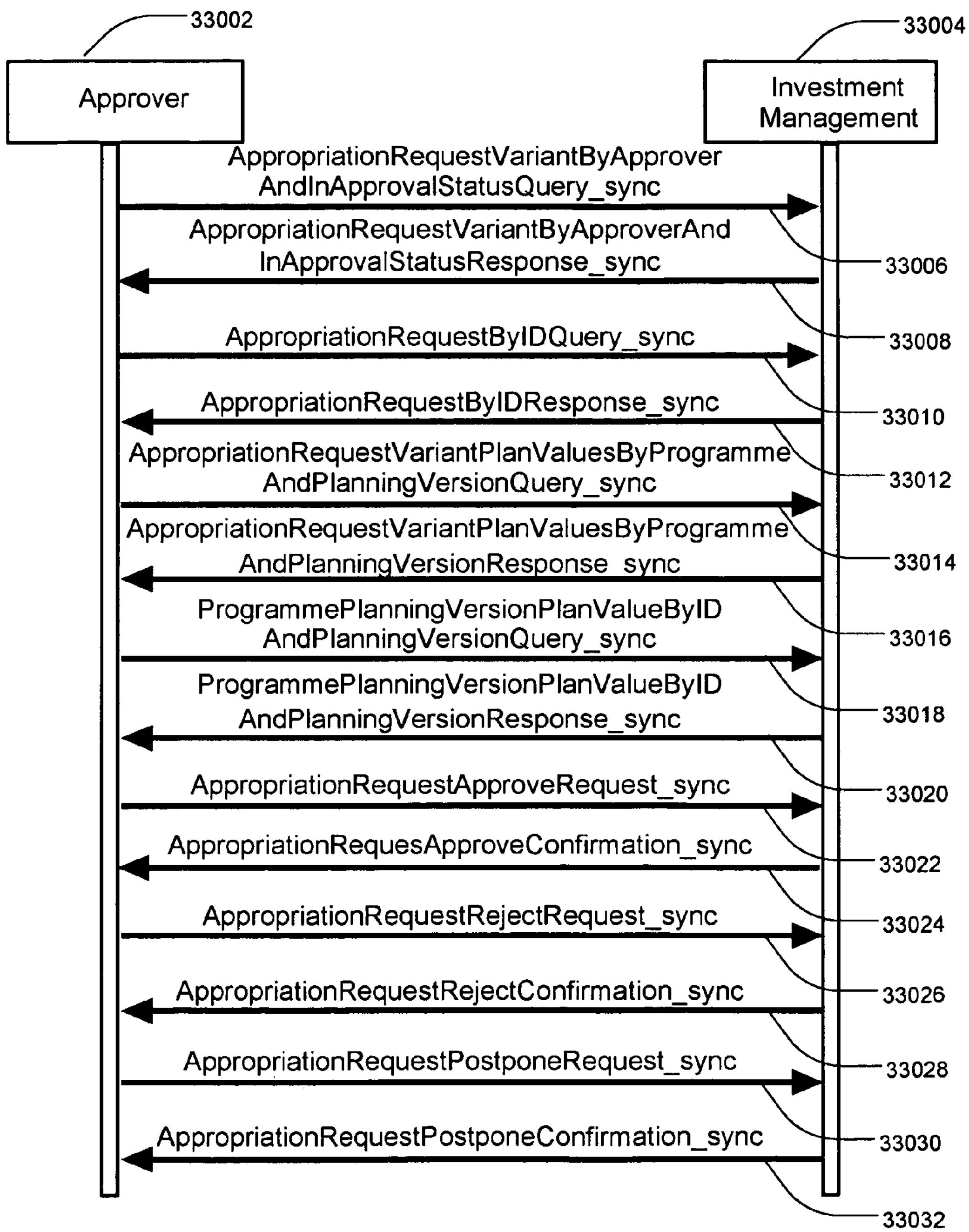
FIG. 33 shows an example AppropriationRequest Message Choreography.

The message choreography of FIG. 33 describes a possible logical sequence of messages that can be used to realize an appropriation request business scenario.

An AppropriationRequestByIDQuery_sync is an inquiry for an AppropriationRequest by its ID. The structure of the message type AppropriationRequestByIDQuery_sync is specified by the message data type AppropriationRequestByIDQueryMessage_sync.

An AppropriationRequestByIDResponse_sync is the response to an AppropriationRequestByIDQuery_sync. The structure of the message type AppropriationRequestByIDResponse_sync is specified by the message data type AppropriationRequestByIDResponseMessage_sync.

An AppropriationRequestVariantByApproverAndInApprovalStatusQuery_sync is an inquiry for AppropriationRequests and their variants to be approved by a particular approver. The structure of the message type AppropriationRequestVariantByApproverAndInApprovalStatusQuery_sync is specified by the message data type AppropriationRequestVariantByApproverAndInApprovalStatusQueryMessage_sync.

An AppropriationRequestVariantByApproverAndInApprovalStatusResponse_sync is the response to an AppropriationRequestVariantByApproverAndInApprovalStatusQuery_sync. The structure of the message type AppropriationRequestVariantByApproverAndInApprovalStatusResponse_sync is specified by the message data type AppropriationRequestVariantByApproverAndInApprovalStatusResponseMessage_sync.

An AppropriationRequestVariantPlanValuesByProgrammeAndPlanningVersionQuery_sync is an inquiry for plan values of a variant of an AppropriationRequest where the AppropriationRequest is assigned to a particular Programme and the AppropriationRequest variant is assigned to a particular planning version. The structure of the message type AppropriationRequestVariantPlanValuesByProgrammeAndPlanningVersionQuery_sync is specified by the message data type AppropriationRequestVariantPlanValuesByProgrammeAndPlanningVersionQueryMessage_sync.

An AppropriationRequestVariantPlanValuesByProgrammeAndPlanningVersionResponse_sync is the response to an AppropriationRequestVariantPlanValuesByProgrammeAndPlanning VersionQuery_sync. The structure of the message type AppropriationRequestVariantPlanValuesByProgrammeAndPlanningVersionResponse_sync is specified by the message data type AppropriationRequestVariantPlanValuesByProgrammeAndPlanningVersionResponseMessage_sync.

An AppropriationRequestApproveRequest_sync is the order to approve an AppropriationRequest. The structure of the message type AppropriationRequestApproveRequest_sync is specified by the message data type AppropriationRequestApproveRequestMessage_sync.

An AppropriationRequestApproveConfirmation_sync is the confirmation to an AppropriationRequestApproveRequest_sync. The structure of the message type AppropriationRequestApproveConfirmation_sync is specified by the message data type AppropriationRequestApproveConfirmationMessage_sync.

An AppropriationRequestRejectRequest_sync is the order to reject an AppropriationRequest. The structure of the message type AppropriationRequestRejectRequest_sync is specified by the message data type AppropriationRequestRejectRequestMessage_sync.

An AppropriationRequestRejectConfirmation_sync is the confirmation to an AppropriationRequestRejectRequest_sync. The structure of the message type AppropriationRequestRejectConfirmation_sync is specified by the message data type AppropriationRequestRejectConfirmationMessage_sync.

An AppropriationRequestPostponeRequest_sync is the order to postpone an AppropriationRequest in order to give the AppropriationRequest initiator the opportunity to review his AppropriationRequest. The structure of the message type AppropriationRequestPostponeRequest_sync is specified by the message data type AppropriationRequestPostponeRequestMessage_sync.

An AppropriationRequestPostponeConfirmation_sync is the confirmation to an AppropriationRequestPostponeRequest_sync. The structure of the message type AppropriationRequestPostponeConfirmation_sync is specified by the message data type AppropriationRequestPostponeConfirmationMessage_sync.

Message Choreography

Figure 34:
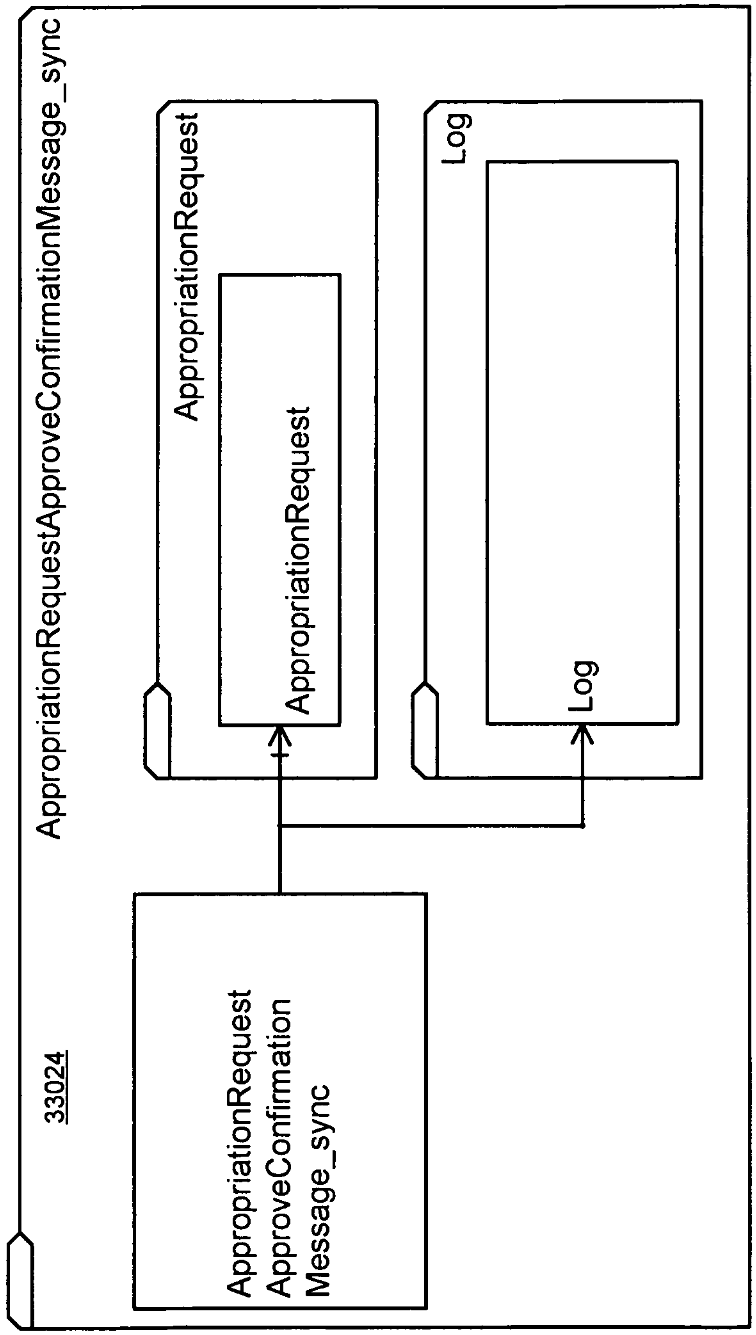
FIG. 34 shows an example AppropriationRequestApproveConfirmationMessage_sync Message Data Type.
Figure 35:
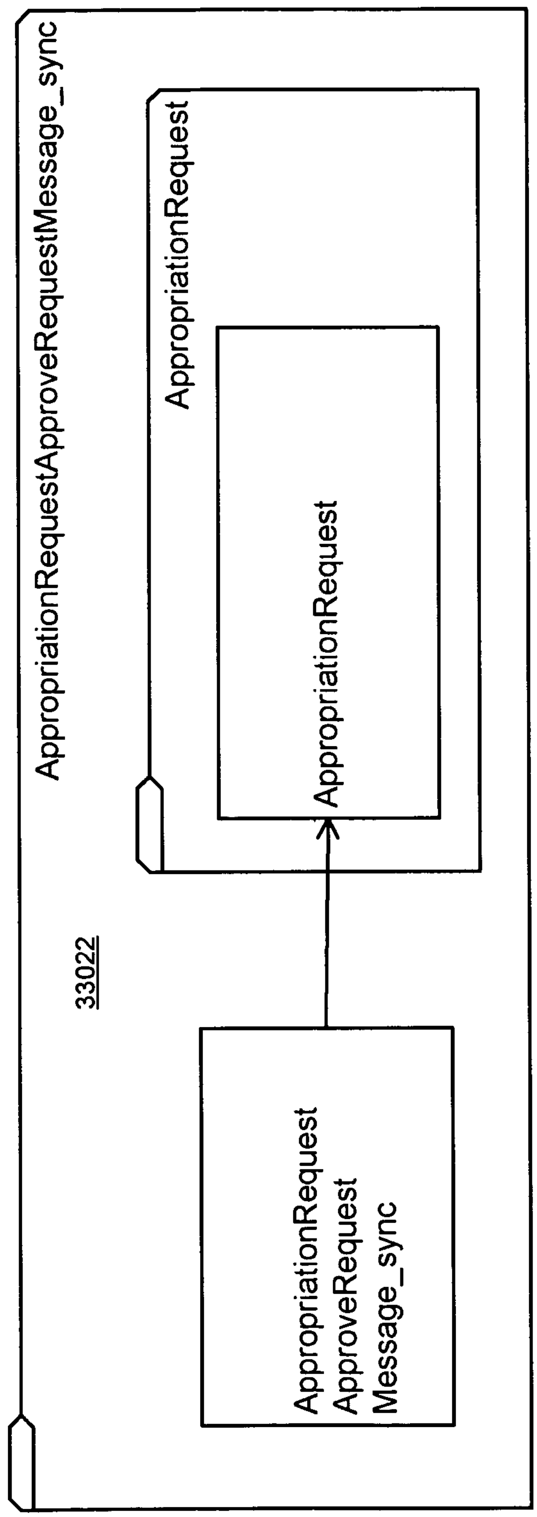
FIG. 35 shows an example AppropriationRequestApproveRequestMessage_sync Message Data Type.
Figure 36:
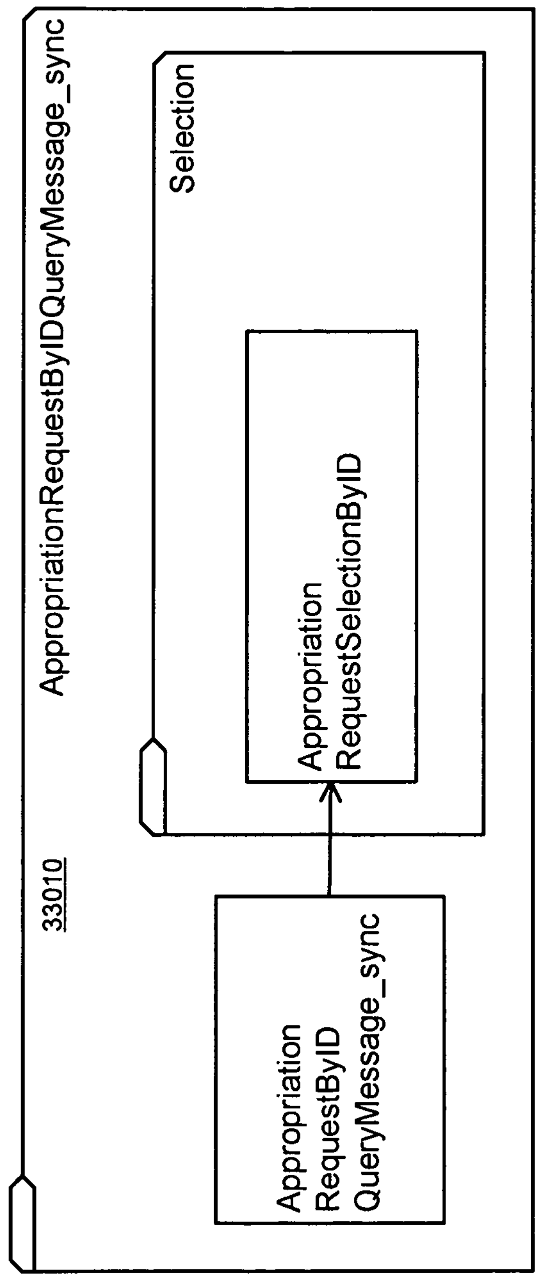
FIG. 36 shows an example AppropriationRequestByIDQueryMessage_sync Message Data Type.
Figure 38:
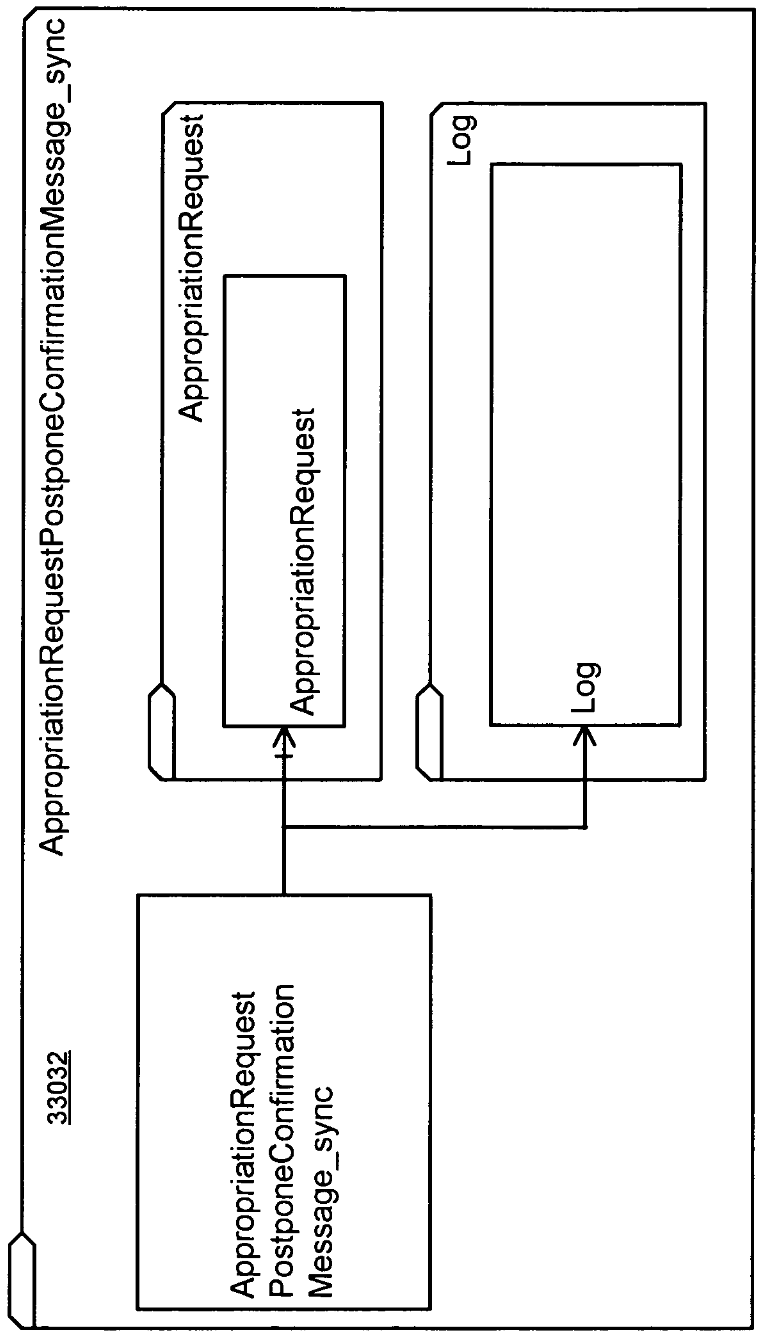
FIG. 38 shows an example AppropriationRequestPostponeConfirmationMessage_sync Message Data Type.
Figure 40:
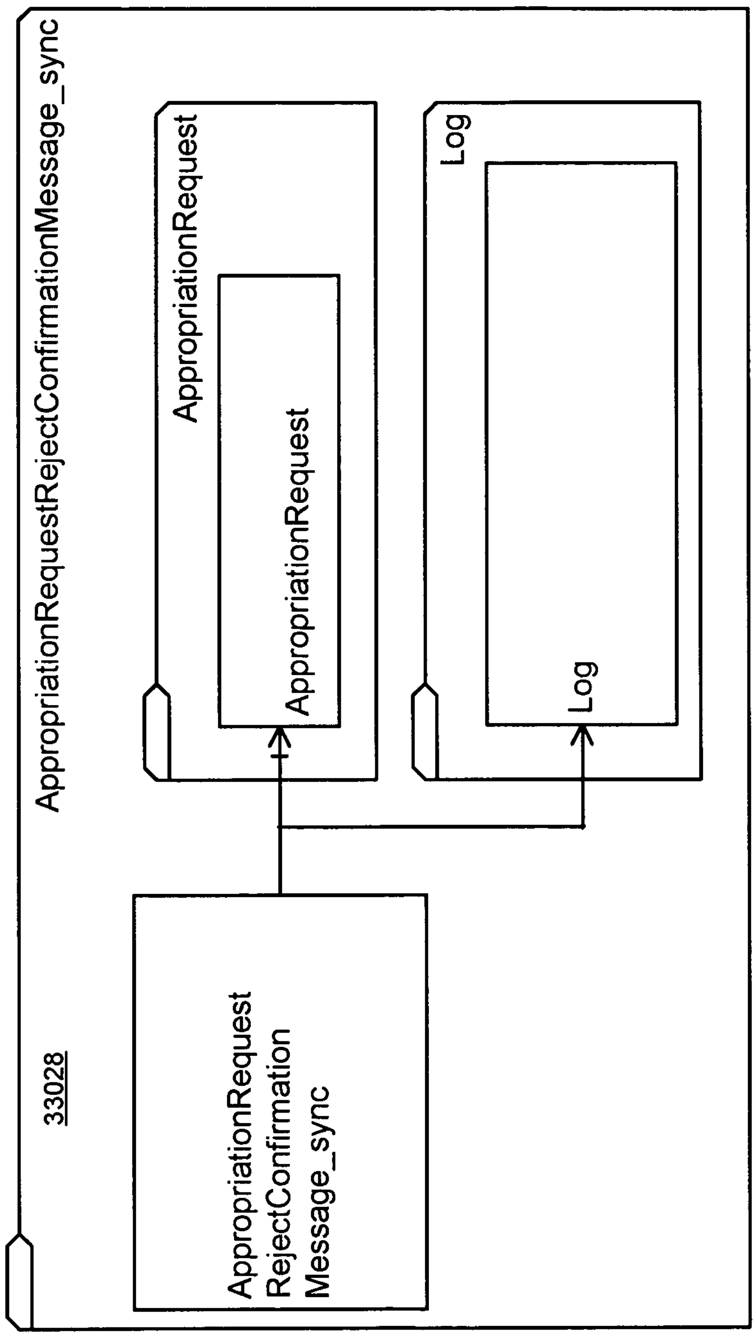
FIG. 40 shows an example AppropriationRequestRejectConfirmationMessage_sync Message Data Type.
Figure 41:
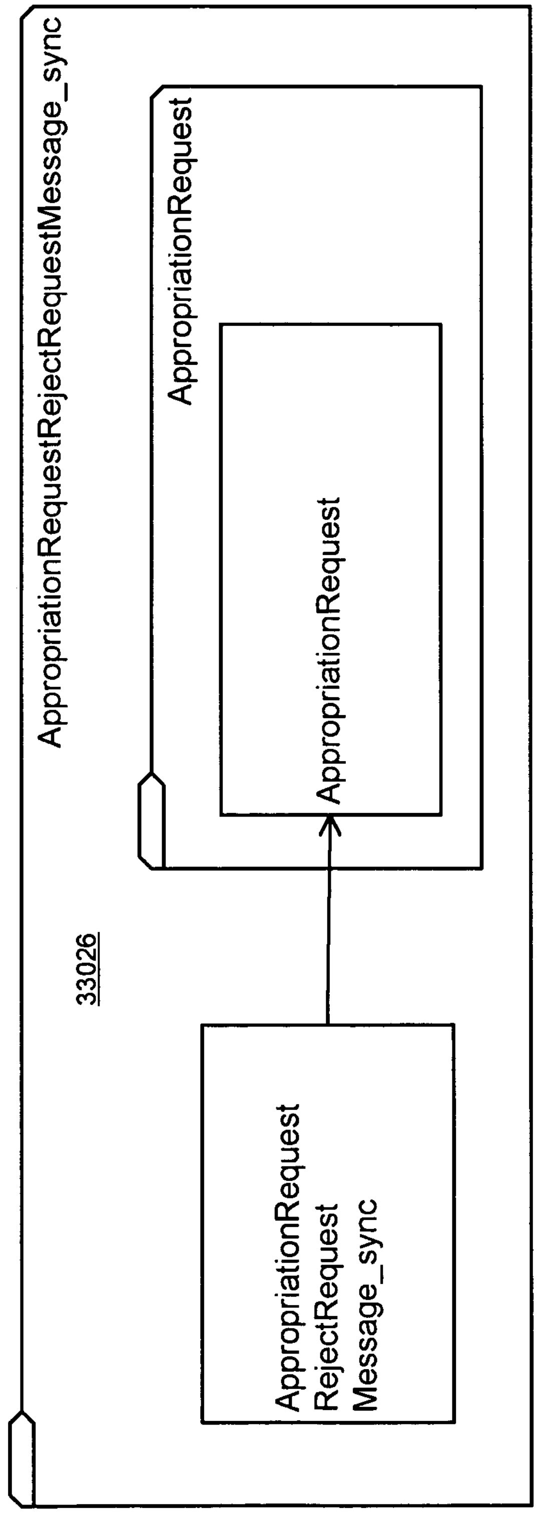
FIG. 41 shows an example AppropriationRequestRejectRequestMessage_sync Message Data Type.
Figure 42:
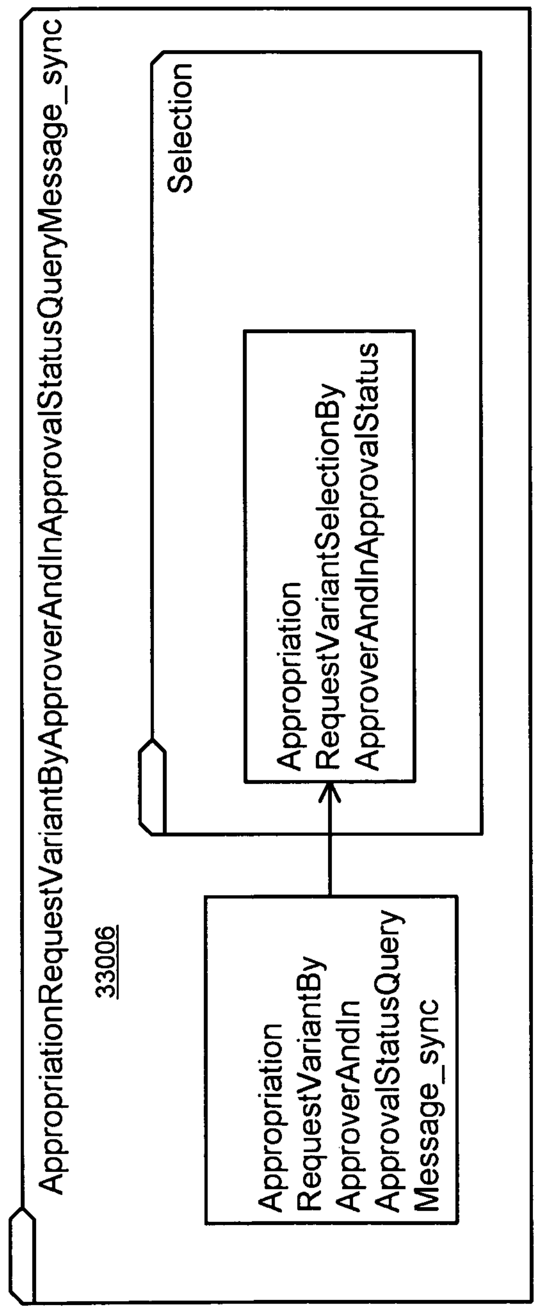
FIG. 42 shows an example AppropriationRequestVariantByApproverAndInApprovalStatusQueryMessage_sync Message Data Type.
Figure 43:
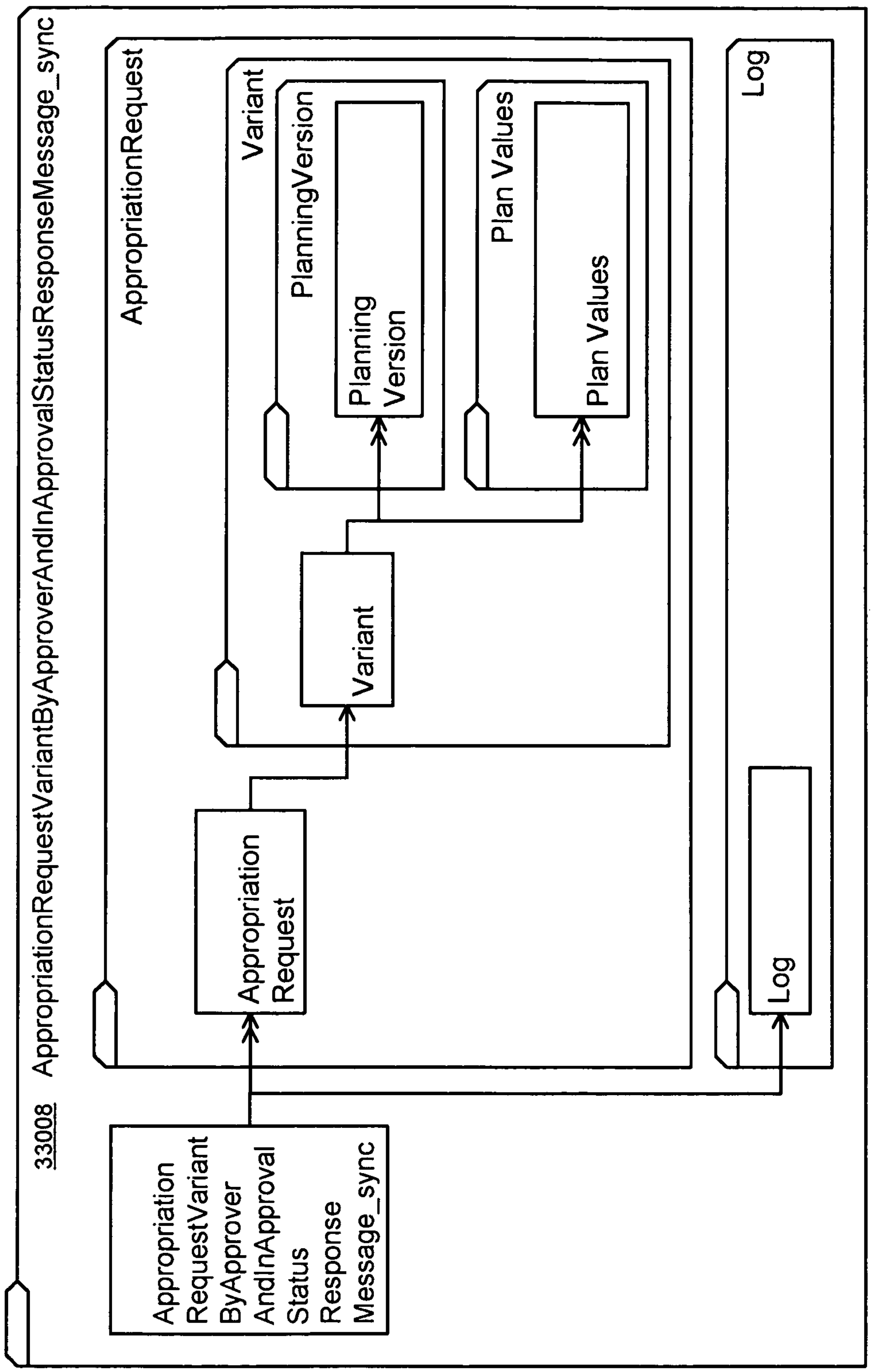
FIG. 43 shows an example AppropriationRequestVariantByApproverAndInApprovalStatusResponseMessage_sync Message Data Type.
Figure 44:
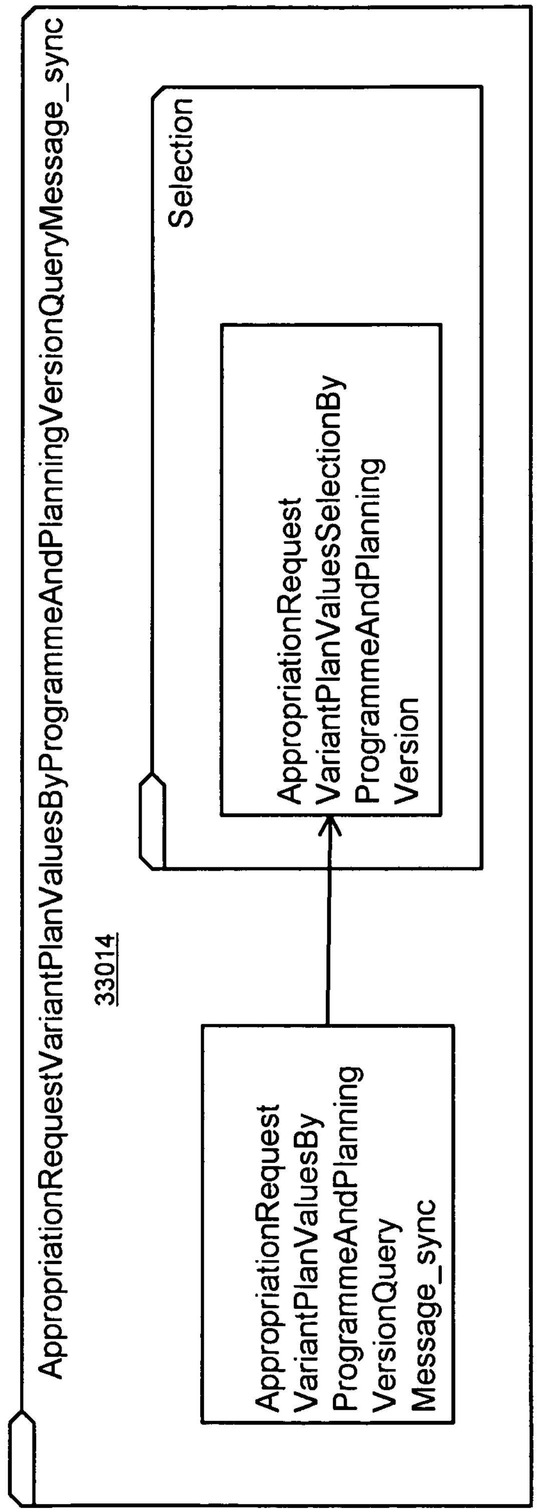
FIG. 44 shows an example AppropriationRequestVariantPlanValuesByProgrammeAndPlanningVersionQueryMessage_sync Message Data Type.
Figure 45:
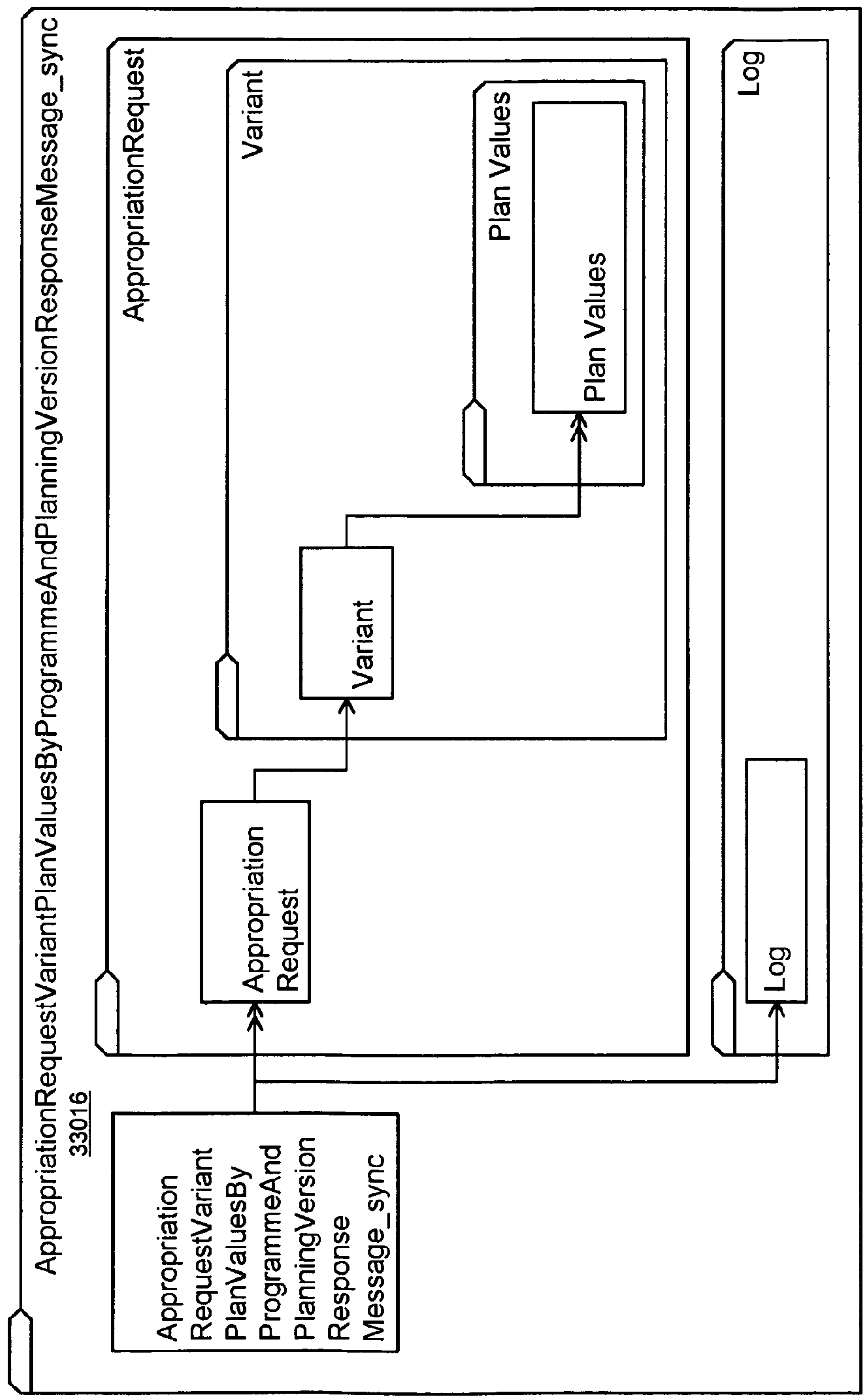
FIG. 45 shows an example AppropriationRequestVariantPlanValuesByProgrammeAndPlanningVersionResponseMessage_sync Message Data Type.

For example, an "Approver" system 33002 can request the status of an appropriation request using the AppropriationRequestVariantByApproverAndInApprovalStatusQuery_sync message 33006 as shown, for example, in FIG. 42. An "Investment Management" system 33004 can respond to the request using the AppropriationRequestVariantByApproverAndInApprovalStatusResponse_sync message 33008 as shown, for example, in FIG. 43. The "Approver" system 33002 can query an appropriation request using the AppropriationRequestByIDQuery_sync message 33010 as shown, for example, in FIG. 36. The "Investment Management" system 33004 can respond to the query using the AppropriationRequestByIDResponse_sync message 33012 as shown, for example, in FIG. 37. The "Approver" system 33002 can query appropriation request variant plan values using the AppropriationRequestVariantPlanValuesByProgrammeAndPlanningVersionQuery_sync message 33014 as shown, for example, in FIG. 44. The "Investment Management" system 33004 can respond to the query using the AppropriationRequestVariantPlanValuesByProgrammeAndPlanningVersionResponse_sync message 33016 as shown, for example, in FIG. 45. The "Approver" system 33002 can query a programme planning version plan value using a ProgrammePlanningVersionPlanValueByIDAndPlanningVersionQuery_sync message 33018. The "Investment Management" system 33004 can respond to the query using a ProgrammePlanningVersionPlanValueByIDAndPlanningVersionResponse_sync message 33020. The "Approver" system 33002 can request an approval for an appropriation request using the AppropriationRequestApproveRequest_sync message 33022 as shown, for example, in FIG. 35. The "Investment Management" system 33004 can confirm the query using the AppropriationRequestApproveConfirmation_sync message 33024 as shown, for example, in FIG. 34. The "Approver" system 33002 can request to reject an appropriation request using the AppropriationRequestRejectRequest_sync message 33026 as shown, for example, in FIG. 41. The "Investment Management" system 33004 can confirm the request using the AppropriationRequestRejectConfirmation_sync message 33028 as shown, for example, in FIG. 40. The "Approver" system 33002 can request postponement of an appropriation request using the AppropriationRequestPostponeRequest_sync message 33030 as shown, for example, in FIG. 39. The "Investment Management" system 33004 can confirm the postponement using the AppropriationRequestPostponeConfirmation_sync message 33032 as shown, for example, in FIG. 38.

The message data type AppropriationRequestByIDQueryMessage_sync includes the selection included in the business document. FIG. 48 shows an AppropriationRequestByIDQueryMessage_sync 48000 package. The AppropriationRequestByIDQueryMessage_sync 48000 package is an AppropriationRequestByIDQueryMessage_sync 48004 datatype. The AppropriationRequestByIDQueryMessage_sync 48000 package includes an AppropriationRequestByIDQueryMessage_sync 48002 entity. The AppropriationRequestByIDQueryMessage_sync 48000 package includes a Selection 48006 package.

The Selection 48006 package is an AppropriationRequestSelectionByID 48012 datatype. The Selection 48006 package includes an AppropriationRequestSelectionByID 48008 entity.

The AppropriationRequestSelectionByID 48008 entity has a cardinality of one 48010 meaning that for each instance of the AppropriationRequestByIDQueryMessage_sync 48002 entity there is one AppropriationRequestSelectionByID 48008 entity. The AppropriationRequestSelectionByID 48008 entity includes an AppropriationRequestID 48014 attribute.

The AppropriationRequestID 48014 attribute is an AppropriationRequestID 48018 datatype. The AppropriationRequestID 48014 attribute has a cardinality of one 48016 meaning that for each instance of the AppropriationRequestSelectionByID 48008 entity there is one AppropriationRequestID 48014 attribute.

Selection Package

AppropriationRequestSelectionByID

AppropriationRequestSelectionByID groups the selection criteria. AppropriationRequestSelectionByID includes one element AppropriationRequestID of type GDT: AppropriationRequestID. AppropriationRequestID is a unique identifier for an AppropriationRequest.

Message Data Type

The message data type AppropriationRequestByIDResponseMessage_sync includes the AppropriationRequest included in the business document and a log. FIGS. 49-1 through 49-12 show an AppropriationRequestByIDResponseMessage_sync 49000 package. The AppropriationRequestByIDResponseMessage_sync 49000 package is an AppropriationRequestByIDResponseMessage_sync 49004 datatype. The AppropriationRequestByIDResponseMessage_sync 49000 package includes an AppropriationRequestByIDResponseMessage_sync 49002 entity. The AppropriationRequestByIDResponseMessage_sync 49000 package includes various packages, namely AppropriationRequest 49006 and Log 49420. The AppropriationRequest 49006 package is an AppropriationRequest 49012 datatype. The AppropriationRequest 49006 package includes an AppropriationRequest 49008 entity. The AppropriationRequest 49006 package includes various packages, namely Party 49140 and Variant 49292. The AppropriationRequest 49008 entity has a cardinality of zero or one 49010 meaning that for each instance of the AppropriationRequestByIDResponseMessage_sync 49002 entity there may be one AppropriationRequest 49008 entity. The AppropriationRequest 49008 entity includes various attributes, namely ID 49014, TypeCode 49020, TypeName 49026, ProgrammeDefinitionID 49032, ApprovalFiscalYearID 49038, ProgrammeID 49044, PlannedImplementationStartDate 49050, InvestmentReasonCode 49056, InvestmentReasonName 49062, EnvironmentInvestmentPurposeCode 49068, EnvironmentInvestmentPurposeName 49074, InvestmentCountryCode 49080, InvestmentCountryName 49086, PriorityCode 49092, PriorityName 49098, InvestmentScaleCode 49104, InvestmentScaleName 49110, ApprovalStatusCode 49116, ApprovalStatusName 49122, Description 49128 and Text 49134. The ID 49014 attribute is an AppropriationRequestID 49018 datatype. The ID 49014 attribute has a cardinality of one 49016 meaning that for each instance of the AppropriationRequest 49008 entity there is one ID 49014 attribute. The TypeCode 49020 attribute is an AppropriationRequestTypeCode 49024 datatype. The TypeCode 49020 attribute has a cardinality of one 49022 meaning that for each instance of the AppropriationRequest 49008 entity there is one TypeCode 49020 attribute. The TypeName 49026 attribute is a LONG_Name 49030 datatype. The TypeName 49026 attribute has a cardinality of zero or one 49028 meaning that for each instance of the AppropriationRequest 49008 entity there may be one TypeName 49026 attribute. The ProgrammeDefinitionID 49032 attribute is a ProgrammeDefinitionID 49036 datatype. The ProgrammeDefinitionID 49032 attribute has a cardinality of one 49034 meaning that for each instance of the AppropriationRequest 49008 entity there is one ProgrammeDefinitionID 49032 attribute. The ApprovalFiscalYearID 49038 attribute is a FiscalYearID 49042 datatype. The ApprovalFiscalYearID 49038 attribute has a cardinality of one 49040 meaning that for each instance of the AppropriationRequest 49008 entity there is one ApprovalFiscalYearID 49038 attribute. The ProgrammeID 49044 attribute is a ProgrammeID 49048 datatype. The ProgrammeID 49044 attribute has a cardinality of one 49046 meaning that for each instance of the AppropriationRequest 49008 entity there is one ProgrammeID 49044 attribute. The PlannedImplementationStartDate 49050 attribute is a Date 49054 datatype. The PlannedImplementationStartDate 49050 attribute has a cardinality of zero or one 49052 meaning that for each instance of the AppropriationRequest 49008 entity there may be one PlannedImplementationStartDate 49050 attribute. The InvestmentReasonCode 49056 attribute is an InvestmentReasonCode 49060 datatype. The InvestmentReasonCode 49056 attribute has a cardinality of zero or one 49058 meaning that for each instance of the AppropriationRequest 49008 entity there may be one InvestmentReasonCode 49056 attribute. The InvestmentReasonName 49062 attribute is a LONG_Name 49066 datatype. The InvestmentReasonName 49062 attribute has a cardinality of zero or one 49064 meaning that for each instance of the AppropriationRequest 49008 entity there may be one InvestmentReasonName 49062 attribute. The EnvironmentInvestmentPurposeCode 49068 attribute is an EnvironmentInvestmentPurposeCode 49072 datatype. The EnvironmentInvestmentPurposeCode 49068 attribute has a cardinality of zero or one 49070 meaning that for each instance of the AppropriationRequest 49008 entity there may be one EnvironmentInvestmentPurposeCode 49068 attribute. The EnvironmentInvestmentPurposeName 49074 attribute is a LONG_Name 49078 datatype. The EnvironmentInvestmentPurposeName 49074 attribute has a cardinality of zero or one 49076 meaning that for each instance of the AppropriationRequest 49008 entity there may be one EnvironmentInvestmentPurposeName 49074 attribute. The InvestmentCountryCode 49080 attribute is a CountryCode 49084 datatype. The InvestmentCountryCode 49080 attribute has a cardinality of zero or one 49082 meaning that for each instance of the AppropriationRequest 49008 entity there may be one InvestmentCountryCode 49080 attribute. The InvestmentCountryName 49086 attribute is a MEDIUM_Name 49090 datatype. The InvestmentCountryName 49086 attribute has a cardinality of zero or one 49088 meaning that for each instance of the AppropriationRequest 49008 entity there may be one InvestmentCountryName 49086 attribute. The PriorityCode 49092 attribute is a PriorityCode 49096 datatype. The PriorityCode 49092 attribute has a cardinality of zero or one 49094 meaning that for each instance of the AppropriationRequest 49008 entity there may be one PriorityCode 49092 attribute. The PriorityName 49098 attribute is a MEDIUM_Name 49102 datatype. The PriorityName 49098 attribute has a cardinality of zero or one 49100 meaning that for each instance of the AppropriationRequest 49008 entity there may be one PriorityName 49098 attribute. The InvestmentScaleCode 49104 attribute is an InvestmentScaleCode 49108 datatype. The InvestmentScaleCode 49104 attribute has a cardinality of zero or one 49106 meaning that for each instance of the AppropriationRequest 49008 entity there may be one InvestmentScaleCode 49104 attribute. The InvestmentScaleName 49110 attribute is a LONG_Name 49114 datatype. The InvestmentScaleName 49110 attribute has a cardinality of zero or one 49112 meaning that for each instance of the AppropriationRequest 49008 entity there may be one InvestmentScaleName 49110 attribute. The ApprovalStatusCode 49116 attribute is an ApprovalStatusCode 49120 datatype. The ApprovalStatusCode 49116 attribute has a cardinality of one 49118 meaning that for each instance of the AppropriationRequest 49008 entity there is one ApprovalStatusCode 49116 attribute. The ApprovalStatusName 49122 attribute is a MEDIUM_Name 49126 datatype. The ApprovalStatusName 49122 attribute has a cardinality of one 49124 meaning that for each instance of the AppropriationRequest 49008 entity there is one ApprovalStatusName 49122 attribute. The Description 49128 attribute is a MEDIUM_Description 49132 datatype. The Description 49128 attribute has a cardinality of zero or one 49130 meaning that for each instance of the AppropriationRequest 49008 entity there may be one Description 49128 attribute. The Text 49134 attribute is a Text 49138 datatype. The Text 49134 attribute has a cardinality of zero or one 49136 meaning that for each instance of the AppropriationRequest 49008 entity there may be one Text 49134 attribute. The Party 49140 package is a Party 49146 datatype. The Party 49140 package includes various entities, namely InvestmentRecipientParty 49142, ProcessorParty 49172, RequestorParty 49202, EmployeeResponsibleParty 49232 and ApproverParty 49262. The InvestmentRecipientParty 49142 entity has a cardinality of zero or n 49144 meaning that for each instance of the AppropriationRequest 49008 entity there may be one or more InvestmentRecipientParty 49142 entities. The InvestmentRecipientParty 49142 entity includes various attributes, namely ID 49148, Name 49154, TypeCode 49160 and TypeName 49166. The ID 49148 attribute is a PartyID 49152 datatype. The ID 49148 attribute has a cardinality of one 49150 meaning that for each instance of the InvestmentRecipientParty 49142 entity there is one ID 49148 attribute. The Name 49154 attribute is a LONG_Name 49158 datatype. The Name 49154 attribute has a cardinality of zero or one 49156 meaning that for each instance of the InvestmentRecipientParty 49142 entity there may be one Name 49154 attribute. The TypeCode 49160 attribute is a BusinessObjectTypeCode 49164 datatype. The TypeCode 49160 attribute has a cardinality of one 49162 meaning that for each instance of the InvestmentRecipientParty 49142 entity there is one TypeCode 49160 attribute. The TypeName 49166 attribute is a LANGUAGEINDEPENDENT_EXTENDED_Name 49170 datatype. The TypeName 49166 attribute has a cardinality of one 49168 meaning that for each instance of the InvestmentRecipientParty 49142 entity there is one TypeName 49166 attribute. The ProcessorParty 49172 entity has a cardinality of zero or n 49174 meaning that for each instance of the AppropriationRequest 49008 entity there may be one or more ProcessorParty 49172 entities. The ProcessorParty 49172 entity includes various attributes, namely ID 49178, Name 49184, TypeCode 49190 and TypeName 49196. The ID 49178 attribute is a PartyID 49182 datatype. The ID 49178 attribute has a cardinality of one 49180 meaning that for each instance of the ProcessorParty 49172 entity there is one ID 49178 attribute.

The Name 49184 attribute is a LONG_Name 49188 datatype. The Name 49184 attribute has a cardinality of zero or one 49186 meaning that for each instance of the ProcessorParty 49172 entity there may be one Name 49184 attribute.

The TypeCode 49190 attribute is a BusinessObjectTypeCode 49194 datatype. The TypeCode 49190 attribute has a cardinality of one 49192 meaning that for each instance of the ProcessorParty 49172 entity there is one TypeCode 49190 attribute. The TypeName 49196 attribute is a LANGUAGEINDEPENDENT_EXTENDED_Name 49200 datatype. The TypeName 49196 attribute has a cardinality of one 49198 meaning that for each instance of the ProcessorParty 49172 entity there is one TypeName 49196 attribute. The RequestorParty 49202 entity has a cardinality of zero or n 49204 meaning that for each instance of the AppropriationRequest 49008 entity there may be one or more RequestorParty 49202 entities. The RequestorParty 49202 entity includes various attributes, namely InternalID 49208, Name 49214, TypeCode 49220 and TypeName 49226. The InternalID 49208 attribute is a PartyInternalID 49212 datatype. The InternalID 49208 attribute has a cardinality of one 49210 meaning that for each instance of the RequestorParty 49202 entity there is one InternalID 49208 attribute. The Name 49214 attribute is a LONG_Name 49218 datatype. The Name 49214 attribute has a cardinality of zero or one 49216 meaning that for each instance of the RequestorParty 49202 entity there may be one Name 49214 attribute. The TypeCode 49220 attribute is a BusinessObjectTypeCode 49224 datatype. The TypeCode 49220 attribute has a cardinality of one 49222 meaning that for each instance of the RequestorParty 49202 entity there is one TypeCode 49220 attribute. The TypeName 49226 attribute is a LANGUAGEINDEPENDENT_EXTENDED_Name 49230 datatype. The TypeName 49226 attribute has a cardinality of one 49228 meaning that for each instance of the RequestorParty 49202 entity there is one TypeName 49226 attribute. The EmployeeResponsibleParty 49232 entity has a cardinality of zero or n 49234 meaning that for each instance of the AppropriationRequest 49008 entity there may be one or more EmployeeResponsibleParty 49232 entities. The EmployeeResponsibleParty 49232 entity includes various attributes, namely InternalID 49238, Name 49244, TypeCode 49250 and TypeName 49256. The InternalID 49238 attribute is a PartyInternalID 49242 datatype. The InternalID 49238 attribute has a cardinality of one 49240 meaning that for each instance of the EmployeeResponsibleParty 49232 entity there is one InternalID 49238 attribute. The Name 49244 attribute is a LONG_Name 49248 datatype. The Name 49244 attribute has a cardinality of zero or one 49246 meaning that for each instance of the EmployeeResponsibleParty 49232 entity there may be one Name 49244 attribute. The TypeCode 49250 attribute is a BusinessObjectTypeCode 49254 datatype. The TypeCode 49250 attribute has a cardinality of one 49252 meaning that for each instance of the EmployeeResponsibleParty 49232 entity there is one TypeCode 49250 attribute. The TypeName 49256 attribute is a LANGUAGEINDEPENDENT_EXTENDED_Name 49260 datatype. The TypeName 49256 attribute has a cardinality of one 49258 meaning that for each instance of the EmployeeResponsibleParty 49232 entity there is one TypeName 49256 attribute. The ApproverParty 49262 entity has a cardinality of zero or n 49264 meaning that for each instance of the AppropriationRequest 49008 entity there may be one or more ApproverParty 49262 entities. The ApproverParty 49262 entity includes various attributes, namely InternalID 49268, Name 49274, TypeCode 49280 and TypeName 49286. The InternalID 49268 attribute is a PartyInternalID 49272 datatype. The InternalID 49268 attribute has a cardinality of one 49270 meaning that for each instance of the ApproverParty 49262 entity there is one InternalID 49268 attribute. The Name 49274 attribute is a LONG_Name 49278 datatype. The Name 49274 attribute has a cardinality of zero or one 49276 meaning that for each instance of the ApproverParty 49262 entity there may be one Name 49274 attribute.

The TypeCode 49280 attribute is a BusinessObjectTypeCode 49284 datatype. The TypeCode 49280 attribute has a cardinality of one 49282 meaning that for each instance of the ApproverParty 49262 entity there is one TypeCode 49280 attribute.

The TypeName 49286 attribute is a LANGUAGEINDEPENDENT_EXTENDED_Name 49290 datatype. The TypeName 49286 attribute has a cardinality of one 49288 meaning that for each instance of the ApproverParty 49262 entity there is one TypeName 49286 attribute. The Variant 49292 package is a Variant 49298 datatype. The Variant 49292 package includes a Variant 49294 entity. The Variant 49292 package includes various packages, namely PlanningVersion 49324, PlanValues 49344 and PreinvestmentAnalysis 49382. The Variant 49294 entity has a cardinality of one or n 49296 meaning that for each instance of the AppropriationRequest 49008 entity there are one or more Variant 49294 entities. The Variant 49294 entity includes various attributes, namely ID 49300, Description 49306, AppropriationRequestVariantAssessmentCode 49312 and AppropriationRequestVariantAssessmentName 49318. The ID 49300 attribute is an AppropriationRequestVariantID 49304 datatype. The ID 49300 attribute has a cardinality of one 49302 meaning that for each instance of the Variant 49294 entity there is one ID 49300 attribute. The Description 49306 attribute is a MEDIUM_Description 49310 datatype. The Description 49306 attribute has a cardinality of zero or one 49308 meaning that for each instance of the Variant 49294 entity there may be one Description 49306 attribute. The AppropriationRequestVariantAssessmentCode 49312 attribute is an AppropriationRequestVariantAssessmentCode 49316 datatype. The AppropriationRequestVariantAssessmentCode 49312 attribute has a cardinality of zero or one 49314 meaning that for each instance of the Variant 49294 entity there may be one AppropriationRequestVariantAssessmentCode 49312 attribute. The AppropriationRequestVariantAssessmentName 49318 attribute is a LONG_Name 49322 datatype. The AppropriationRequestVariantAssessmentName 49318 attribute has a cardinality of zero or one 49320 meaning that for each instance of the Variant 49294 entity there may be one AppropriationRequestVariantAssessmentName 49318 attribute. The PlanningVersion 49324 package is a PlanningVersion 49330 datatype. The PlanningVersion 49324 package includes a PlanningVersion 49326 entity. The PlanningVersion 49326 entity has a cardinality of zero or n 49328 meaning that for each instance of the Variant 49294 entity there may be one or more PlanningVersion 49326 entities. The PlanningVersion 49326 entity includes various attributes, namely AccountingPlanningVersionCode 49332 and AccountingPlanningVersionName 49338. The AccountingPlanningVersionCode 49332 attribute is an AccountingPlanningVersionCode 49336 datatype. The AccountingPlanningVersionCode 49332 attribute has a cardinality of one 49334 meaning that for each instance of the PlanningVersion 49326 entity there is one AccountingPlanningVersionCode 49332 attribute. The AccountingPlanningVersionName 49338 attribute is a LONG_Name 49342 datatype. The AccountingPlanningVersionName 49338 attribute has a cardinality of zero or one 49340 meaning that for each instance of the PlanningVersion 49326 entity there may be one AccountingPlanningVersionName 49338 attribute. The PlanValues 49344 package is a PlanValues 49350 datatype. The PlanValues 49344 package includes a PlanValues 49346 entity. The PlanValues 49346 entity has a cardinality of zero or n 49348 meaning that for each instance of the Variant 49294 entity there may be one or more PlanValues 49346 entities. The PlanValues 49346 entity includes various attributes, namely FiscalYearDependencyIndicator 49352, FiscalYearID 49358, InvestmentAmount 49364, OverheadAmount 49370 and RevenueAmount 49376. The FiscalYearDependencyIndicator 49352 attribute is an Indicator 49356 datatype. The FiscalYearDependencyIndicator 49352 attribute has a cardinality of zero or one

49354 meaning that for each instance of the PlanValues 49346 entity there may be one FiscalYearDependencyIndicator 49352 attribute. The FiscalYearID 49358 attribute is a FiscalYearID 49362 datatype. The FiscalYearID 49358 attribute has a cardinality of zero or one 49360 meaning that for each instance of the PlanValues 49346 entity there may be one FiscalYearID 49358 attribute. The InvestmentAmount 49364 attribute is an Amount 49368 datatype. The InvestmentAmount 49364 attribute has a cardinality of zero or one 49366 meaning that for each instance of the PlanValues 49346 entity there may be one InvestmentAmount 49364 attribute. The OverheadAmount 49370 attribute is an Amount 49374 datatype. The OverheadAmount 49370 attribute has a cardinality of zero or one 49372 meaning that for each instance of the PlanValues 49346 entity there may be one OverheadAmount 49370 attribute. The RevenueAmount 49376 attribute is an Amount 49380 datatype. The RevenueAmount 49376 attribute has a cardinality of zero or one 49378 meaning that for each instance of the PlanValues 49346 entity there may be one RevenueAmount 49376 attribute. The PreinvestmentAnalysis 49382 package is a PreinvestmentAnalysis 49388 datatype. The PreinvestmentAnalysis 49382 package includes a PreinvestmentAnalysis 49384 entity. The PreinvestmentAnalysis 49384 entity has a cardinality of zero or one 49386 meaning that for each instance of the Variant 49294 entity there may be one PreinvestmentAnalysis 49384 entity. The PreinvestmentAnalysis 49384 entity includes various attributes, namely DiscountReferenceDate 49390, NetPresentValueAmount 49396, InternalRateOfReturnPercent 49402, PaybackPeriodDuration 49408 and DiscountedCashFlowRatio 49414. The DiscountReferenceDate 49390 attribute is a Date 49394 datatype. The DiscountReferenceDate 49390 attribute has a cardinality of one 49392 meaning that for each instance of the PreinvestmentAnalysis 49384 entity there is one DiscountReferenceDate 49390 attribute. The NetPresentValueAmount 49396 attribute is an Amount 49400 datatype. The NetPresentValueAmount 49396 attribute has a cardinality of one 49398 meaning that for each instance of the PreinvestmentAnalysis 49384 entity there is one NetPresentValueAmount 49396 attribute. The InternalRateOfReturnPercent 49402 attribute is a Percent 49406 datatype. The InternalRateOfReturnPercent 49402 attribute has a cardinality of zero or one 49404 meaning that for each instance of the PreinvestmentAnalysis 49384 entity there may be one InternalRateOfReturnPercent 49402 attribute. The PaybackPeriodDuration 49408 attribute is a YEAR_Duration 49412 datatype. The PaybackPeriodDuration 49408 attribute has a cardinality of zero or one 49410 meaning that for each instance of the PreinvestmentAnalysis 49384 entity there may be one PaybackPeriodDuration 49408 attribute. The DiscountedCashFlowRatio 49414 attribute is a Ratio 49418 datatype. The DiscountedCashFlowRatio 49414 attribute has a cardinality of zero or one 49416 meaning that for each instance of the PreinvestmentAnalysis 49384 entity there may be one DiscountedCashFlowRatio 49414 attribute. The Log 49420 package is a Log 49426 datatype. The Log 49420 package includes a Log 49422 entity. The Log 49422 entity has a cardinality of one 49424 meaning that for each instance of the AppropriationRequestByIDResponseMessage_sync 49002 entity there is one Log 49422 entity.

AppropriationRequest Package

AppropriationRequest

An AppropriationRequest is an idea or wish for carrying out an investment measure or other type of measure, which has to be individually assessed and approved by one or more positions within an enterprise, primarily because of the high costs involved.

An appropriation request can relate to any number of measures, which initially incur costs but over the long term generate revenue or provide other benefits. (These measures can be capital investments, research and development projects, or large-scale maintenance and repairs, for example.)

ID is a unique identifier for an AppropriationRequest. AppropriationRequestTypeCode is the coded representation of an appropriation request type. TypeName of is the name of an appropriation request type. ProgrammeDefinitionID is an unique identifier for a ProgrammeDefinition. A ProgrammeDefinition is a group of programmes with the same or a similar purpose (e.g. investment or maintenance). ApprovalFiscalYearID is the numerical value that designates a fiscal year. A fiscal year (business year) is a specific period of time designated by a numerical year value for which the profit and loss of a company is regularly accounted (inventory and balance sheet). ApprovalFiscalYearID is the fiscal year in which a Programme is approved. ProgrammeID is an identifier for a Programme. A Programme is an organizational center for administrating a group of projects or subprograms. Programme represents a complex, time restricted endeavor for reaching higher-level goals within a far-reaching strategy. Within a set of Programmes specified by a combination of, ProgrammeDefinitionID, and ApprovalFiscalYearID. The ProgrammeID is a unique identifier for a Programme. PlannedImplementationStartDate is the specification of an exact day in the Gregorian calendar. PlannedImplementationStartDate is the date at which the implementation of the AppropriationRequest is planned to be started. InvestmentReasonCode is a coded representation of the reason for an investment. InvestmentReasonName is the name of an investment reason. EnvironmentInvestmentPurposeCode is a coded representation of the purpose of an investment with regards to environmental requirements. EnvironmentInvestmentPurposeName is the name of the purpose of an investment with regards to environmental requirements. The CountryCode is a coded representation of a country defined by either national or administrative/political borders. In this case InvestmentCountryCode is the coded representation of the country in which the investment would take place. InvestmentCountryName is the name of the country in which the investment would take place. The PriorityCode is a coded representation of the (linear ordered) ranking of urgencies. In this case PriorityCode is the coded representation of the priority of an AppropriationRequest. PriorityName is the name of the priority of an AppropriationRequest. InvestmentScaleCode is a coded representation of the scale or magnitude of an investment. InvestmentScaleName is the name of the scale or magnitude of an investment. ApprovalStatusCode is the coded representation of the approval status of an appropriation request. The ApprovalStatusCode may represent either not started (1), for approval (3), approved (4) or rejected (5). PriorityName is the name of the approval status of an appropriation request. Description is the description of the AppropriationRequest. Text is an arbitrary long text that gives a more detailed description of the appropriation request and the investment idea behind it.

Party Package

Party includes the entities InvestmentRecipientParty, ProcessorParty, RequestorParty, EmployeeResponsibleParty and ApproverParty.

InvestmentRecipientParty

An InvestmentRecipientParty of an AppropriationRequest is the company, cost center or profit center to whom the planned investment is provided. ID is a unique identifier for a party. In this case ID is the identification of the company, cost center or profit center to whom the planned investment is provided. Name (optional) is the name of the Party. TypeCode is the coded representation of the type of business object. In this case TypeCode is the coded representation for the involved business object type Company (154), CostCentre (158) or ProfitCentre (229). TypeName (optional) is the name of the type of business object.

ProcessorParty

A ProcessorParty of an AppropriationRequest is the company, cost center or profit center which processes the planned investment. ID is a unique identifier for a party. In this case ID is the identification of the company, cost center or profit center which processes the planned investment. Name (optional) is the name of the Party. TypeCode is the coded representation of the type of business object. In this case TypeCode is the coded representation for the involved business object type Company (154), CostCentre (158) or ProfitCentre (229). (optional) is the name of the type of business object.

RequestorParty

A RequestorParty of an AppropriationRequest is the employee that requests the planned investment. InternalID is a unique identifier for a party. In this case ID is the identification of the employee that requests the planned investment. Name (optional) is the name of the Party. TypeCode is the coded representation of the type of business object. In this case TypeCode is the coded representation for the involved business object type Employee. TypeName (optional) is the name of the type of business object.

EmployeeResponsibleParty

An EmployeeResponsibleParty of an AppropriationRequest is the employee that is responsible for the planned investment. InternalID is a unique identifier for a party. In this case ID is the identification of the employee that is responsible for the planned investment. Name (optional) is the name of the Party. TypeCode is the coded representation of the type of business object. In this case TypeCode is the coded representation for the involved business object type Employee. TypeName (optional) is the name of the type of business object.

ApproverParty

An ApproverParty of an AppropriationRequest is the employee that approves the planned investment. InternalID is a unique identifier for a party. In this case ID is the identification of the employee that approves the planned investment. Name (optional) is the name of the Party. TypeCode is the coded representation of the type of business object. In this case TypeCode is the coded representation for the involved business object type Employee. TypeName (optional) is the name of the type of business object.

Variant Package

Variant includes the entity Variant.

Variant

A Variant is a possible way to implement an AppropriationRequest. ID is a unique identifier for a variant within an AppropriationRequest. An AppropriationRequestVariant is a possible way to implement an AppropriationRequest. Description (optional) is the description of the AppropriationRequestVariant. AssessmentCode (optional) is a coded representation of the assessment of the AppropriationRequestVariant. AssessmentName (optional) is the name of an assessment.

PlanningVersion Package

PlanningVersion includes the entity PlanningVersion.

PlanningVersion

A planning version is a valuation view on planned costs or revenues in Accounting. PlanningVersion includes the planning version(s) the AppropriationRequest variant is assigned to. AccountingPlanningVersionCode is a coded representation of a planning version used in Accounting. A planning version is a valuation view on planned costs or revenues in Accounting. AccountingPlanningVersionName (optional) is the name of an accounting planning version.

Values Package

Values includes the entities PlanValues and PreinvestmentAnalysis.

PlanValues

PlanValues are planned investment costs, overhead costs or revenues of an AppropriationRequest variant. The FiscalYearDependencyIndicator (optional) specifies whether the plan values are fiscal year dependent or not. A FiscalYearID (optional) is the numerical value that designates a fiscal year. A fiscal year (business year) is a specific period of time designated by a numerical year value for which the profit and loss of a company is regularly accounted (inventory and balance sheet). An Amount (optional) is an amount with the corresponding currency unit. InvestmentAmount specifies the amount of planned costs that is supposed to be activated to fixed assets. An Amount is an amount with the corresponding currency unit. OverheadAmount (optional) specifies the amount of planned costs that is not supposed to be activated to fixed assets. An Amount (optional) is an amount with the corresponding currency unit. RevenueAmount specifies the amount of planned revenues.

PreinvestmentAnalysis

PreinvestmentAnalysis is the preinvestment analysis (or profitability analysis) calculation on an AppropriationRequest variant. It estimates the profitability of a planned investment. A Date is the specification of an exact day in the Gregorian calendar. ValueCalculationReferenceDate is the date to which the cash flow is discounted to. An Amount is an amount with the corresponding currency unit. NetPresentValueAmount is a profitability analysis figure used for assessing an investment by means of the net present value. The net present value is determined as the total of the discounted cash flow amounts. InternalRateOfReturnPercent (optional) indicates the return on investment as a key figure percentage. You might compare this figure to the capital market interest rate in order to assess the annual rate of return. PaybackPeriodDuration (optional) specifies the number of years in which the investment has paid for itself, that is, the cash inflows from the investment equal the total costs of the investment. DiscountedCashFlowRatio (optional) is a preinvestment analysis figure used for assessing an investment by means of the discounted cash flow rate. The discounted cash flow rate represents the relationship of net present value to capital used. The capital used is calculated from the total of the discounted costs.

Log Package

Log Entity

A Log is a sequence of messages that result when an application executes a task.

Message Data Type

The message data type AppropriationRequestVariantByApproverAndInApprovalStatusQueryMessage_sync includes the selection included in the business document. FIG. 54 shows an AppropriationRequestVariantByApproverAndInApprovalStatusQueryMessage_sync 54000 package. The AppropriationRequestVariantByApproverAndInApprovalStatusQueryMessage_sync 54000 package is an AppropriationRequestVariantByApproverAndInApprovalStatusQueryMessage_sync 54004 datatype. The AppropriationRequestVariantByApproverAndInApprovalStatusQueryMessage_sync 54000 package includes an AppropriationRequestVariantByApproverAndInApprovalStatusQueryMessage_sync 54002 entity. The AppropriationRequestVariantByApproverAndInApprovalStatusQueryMessage_sync 54000 package includes a Selection 54006 package.

The Selection 54006 package is an AppropriationRequestVariantSelectionByApproverAndInApprovalStatus 54012 datatype. The Selection 54006 package includes an AppropriationRequestVariantSelectionByApproverAndInApprovalStatus 54008 entity.

The AppropriationRequestVariantSelectionByApproverAndInApprovalStatus 54008 entity has a cardinality of one 54010 meaning that for each instance of the AppropriationRequestVariantByApproverAndInApprovalStatusQueryMessage_sync 54002 entity there is one AppropriationRequestVariantSelectionByApproverAndInApprovalStatus 54008 entity. The AppropriationRequestVariantSelectionByApproverAndInApprovalStatus 54008 entity includes a PartyInternalID 54014 attribute.

The PartyInternalID 54014 attribute is a PartyInternalID 54018 datatype. The PartyInternalID 54014 attribute has a cardinality of one 54016 meaning that for each instance of the AppropriationRequestVariantSelectionByApproverAndInApprovalStatus 54008 entity there is one PartyInternalID 54014 attribute.

Selection Package

The Selection package includes the AppropriationRequestVariantSelectionByApproverAndInApprovalStatus entity.

AppropriationRequestVariantSelctionByApproverAndInApprovalStatus

AppropriationRequestVariantSelectionByApproverAndInApprovalStatus groups the selection criteria. PartyInternalID is a unique identifier for the party (employee) that approves the appropriation request.

Message Data Type

The message data type AppropriationRequestVariantByApproverAndInApprovalStatusResponseMessage_sync includes the AppropriationRequest and its variant to be approved included in the business document and a log. FIGS. 55-1 through 55-3 show an AppropriationRequestVariantByApproverAndInApprovalStatusResponseMessage_sync 55000 package. The AppropriationRequestVariantByApproverAndInApprovalStatusResponseMessage_sync 55000 package is an AppropriationRequestVariantByApproverAndInApprovalStatusResponseMessage_sync 55004 datatype. The AppropriationRequestVariantByApproverAndInApprovalStatusResponseMessage_sync 55000 package includes an AppropriationRequestVariantByApproverAndInApprovalStatusResponseMessage_sync 55002 entity. The AppropriationRequestVariantByApproverAndInApprovalStatusResponseMessage_sync 55000 package includes various packages, namely AppropriationRequest 55006 and Log 55122.

The AppropriationRequest 55006 package is an AppropriationRequest 55012 datatype. The AppropriationRequest 55006 package includes an AppropriationRequest 55008 entity. The AppropriationRequest 55006 package includes a Variant 55044 package.

The AppropriationRequest 55008 entity has a cardinality of zero or n 55010 meaning that for each instance of the AppropriationRequestVariantByApproverAndInApprovalStatusResponseMessage_sync 55002 entity there may be one or more AppropriationRequest 55008 entities. The AppropriationRequest 55008 entity includes various attributes, namely ID 55014, Description 55020, ProgrammeDefinitionID 55026, ApprovalFiscalYearID 55032 and ProgrammeID 55038.

The ID 55014 attribute is an AppropriationRequestID 55018 datatype. The ID 55014 attribute has a cardinality of one 55016 meaning that for each instance of the AppropriationRequest 55008 entity there is one ID 55014 attribute.

The Description 55020 attribute is a MEDIUM_Description 55024 datatype. The Description 55020 attribute has a cardinality of zero or one 55022 meaning that for each instance of the AppropriationRequest 55008 entity there may be one Description 55020 attribute.

The ProgrammeDefinitionID 55026 attribute is a ProgrammeDefinitionID 55030 datatype. The ProgrammeDefinitionID 55026 attribute has a cardinality of one 55028 meaning that for each instance of the AppropriationRequest 55008 entity there is one ProgrammeDefinitionID 55026 attribute.

The ApprovalFiscalYearID 55032 attribute is an ApprovalFiscalYearID 55036 datatype. The ApprovalFiscalYearID 55032 attribute has a cardinality of one 55034 meaning that for each instance of the AppropriationRequest 55008 entity there is one ApprovalFiscalYearID 55032 attribute.

The ProgrammeID 55038 attribute is a ProgrammeID 55042 datatype. The ProgrammeID 55038 attribute has a cardinality of one 55040 meaning that for each instance of the AppropriationRequest 55008 entity there is one ProgrammeID 55038 attribute.

The Variant 55044 package is a Variant 55050 datatype. The Variant 55044 package includes a Variant 55046 entity. The Variant 55044 package includes various packages, namely PlanningVersion 55064 and PlanValues 55084.

The Variant 55046 entity has a cardinality of one 55048 meaning that for each instance of the AppropriationRequest 55008 entity there is one Variant 55046 entity. The Variant 55046 entity includes various attributes, namely ID 55052 and Description 55058.

The ID 55052 attribute is an AppropriationRequestVariantID 55056 datatype. The ID 55052 attribute has a cardinality of one 55054 meaning that for each instance of the Variant 55046 entity there is one ID 55052 attribute.

The Description 55058 attribute is a MEDIUM_Description 55062 datatype. The Description 55058 attribute has a cardinality of zero or one 55060 meaning that for each instance of the Variant 55046 entity there may be one Description 55058 attribute.

The PlanningVersion 55064 package is a PlanningVersion 55070 datatype. The PlanningVersion 55064 package includes a PlanningVersion 55066 entity.

The PlanningVersion 55066 entity has a cardinality of zero or n 55068 meaning that for each instance of the Variant 55046 entity there may be one or more PlanningVersion 55066 entities. The PlanningVersion 55066 entity includes various attributes, namely AccountingPlanningVersionCode 55072 and AccountingPlanningVersionName 55078.

The AccountingPlanningVersionCode 55072 attribute is an AccountingPlanningVersionCode 55076 datatype. The AccountingPlanningVersionCode 55072 attribute has a cardinality of one 55074 meaning that for each instance of the PlanningVersion 55066 entity there is one AccountingPlanningVersionCode 55072 attribute.

The AccountingPlanningVersionName 55078 attribute is a LONG_name 55082 datatype. The AccountingPlanningVersionName 55078 attribute has a cardinality of zero or one

55080 meaning that for each instance of the PlanningVersion 55066 entity there may be one AccountingPlanningVersionName 55078 attribute.

The PlanValues 55084 package is a PlanValues 55090 datatype. The PlanValues 55084 package includes a PlanValues 55086 entity.

The PlanValues 55086 entity has a cardinality of zero or n 55088 meaning that for each instance of the Variant 55046 entity there may be one or more PlanValues 55086 entities. The PlanValues 55086 entity includes various attributes, namely FiscalYearDependencyIndicator 55092, FiscalYearID 55098, InvestmentAmount 55104, OverheadAmount 55110 and RevenueAmount 55116.

The FiscalYearDependencyIndicator 55092 attribute is an Indicator 55096 datatype. The FiscalYearDependencyIndicator 55092 attribute has a cardinality of zero or one 55094 meaning that for each instance of the PlanValues 55086 entity there may be one FiscalYearDependencyIndicator 55092 attribute.

The FiscalYearID 55098 attribute is a FiscalYearID 55102 datatype. The FiscalYearID 55098 attribute has a cardinality of zero or one 55100 meaning that for each instance of the PlanValues 55086 entity there may be one FiscalYearID 55098 attribute.

The InvestmentAmount 55104 attribute is an Amount 55108 datatype. The InvestmentAmount 55104 attribute has a cardinality of zero or one 55106 meaning that for each instance of the PlanValues 55086 entity there may be one InvestmentAmount 55104 attribute.

The OverheadAmount 55110 attribute is an Amount 55114 datatype. The OverheadAmount 55110 attribute has a cardinality of zero or one 55112 meaning that for each instance of the PlanValues 55086 entity there may be one OverheadAmount 55110 attribute.

The RevenueAmount 55116 attribute is an Amount 55120 datatype. The RevenueAmount 55116 attribute has a cardinality of zero or one 55118 meaning that for each instance of the PlanValues 55086 entity there may be one RevenueAmount 55116 attribute.

The Log 55122 package is a Log 55128 datatype. The Log 55122 package includes a Log 55124 entity.

The Log 55124 entity has a cardinality of one 55126 meaning that for each instance of the AppropriationRequestVariantByApproverAndInApprovalStatusResponseMessage_sync 55002 entity there is one Log 55124 entity.

AppropriationRequest Package

The AppropriationRequest package includes the AppropriationRequest entity. It includes the package Variant.

AppropriationRequest

An AppropriationRequest is an idea or wish for carrying out an investment measure or other type of measure, which has to be individually assessed and approved by one or more positions within an enterprise, primarily because of the high costs involved.

An appropriation request can relate to any number of measures, which initially incur costs but over the long term generate revenue or provide other benefits. (These measures can be capital investments, research and development projects, or large-scale maintenance and repairs, for example.)

ID is a unique identifier for an AppropriationRequest. Description (optional) is the description of the AppropriationRequest. A ProgrammeDefinitionID is a unique identifier for a ProgrammeDefinition. A ProgrammeDefinition is a group of programmes with the same or a similar purpose (e.g. investment or maintenance). A FiscalYearID is the numerical value that designates a fiscal year. A fiscal year (business year) is a specific period of time designated by a numerical year value for which the profit and loss of a company is regularly accounted (inventory and balance sheet). ApprovalFiscalYearID is the fiscal year in which a Programme is approved. ProgrammeID is an identifier for a Programme. A Programme is an organizational center for administrating a group of projects or subprograms. Programme represents a complex, time restricted endeavor for reaching higher-level goals within a far-reaching strategy. Within a set of Programmes specified by a combination of ProgrammeDefinitionID and ApprovalFiscalYearID. The ProgrammeID is a unique identifier for a Programme.

Variant Package

Variant

A Variant is a possible way to implement an AppropriationRequest. ID is a unique identifier for a variant within an AppropriationRequest. An AppropriationRequestVariant is a possible way to implement an AppropriationRequest. Description (optional) is the description of the AppropriationRequestVariant.

PlanningVersion Package

PlanningVersion

PlanningVersion includes the planning version(s) the AppropriationRequest variant is assigned to. A planning version is a valuation view on planned costs or revenues in Accounting. AccountingPlanningVersionCode is a coded representation of a planning version used in Accounting. A planning version is a valuation view on planned costs or revenues in Accounting. AccountingPlanningVersionName (optional) is the name of an accounting planning version.

PlanValues Package

PlanValues

PlanValues are planned investment costs, overhead costs or revenues of an AppropriationRequest. The FiscalYearDependencyIndicator (optional) specifies whether the plan values are fiscal year dependent or not. A FiscalYearID (optional) is the numerical value that designates a fiscal year. A fiscal year (business year) is a specific period of time designated by a numerical year value for which the profit and loss of a company is regularly accounted (inventory and balance sheet). An Amount (optional) is an amount with the corresponding currency unit. InvestmentAmount (optional) specifies the amount of planned costs that is supposed to be activated to fixed assets. An Amount is an amount with the corresponding currency unit. OverheadAmount (optional) specifies the amount of planned costs that is not supposed to be activated to fixed assets. An Amount is an amount with the corresponding currency unit. RevenueAmount (optional) specifies the amount of planned revenues.

Message Data Type

The message data type AppropriationRequestVariantPlanValuesByProgrammeAndPlanningVersionQueryMessage_sync includes the selection included in the business document. FIGS. 56-1 through 56-2 show an AppropriationRequestVariantPlanValuesByProgrammeAndPlanningVersionQueryMessage_sync 56000 package. The AppropriationRequestVariantPlanValuesByProgrammeAndPlanningVersionQueryMessage_sync 56000 package is an AppropriationRequestVariantPlanValuesByProgrammeAndPlanningVersionQueryMessage_sync 56004 datatype. The AppropriationRequestVariantPlanValuesByProgrammeAndPlanningVersionQueryMessage_sync 56000 package includes an AppropriationRequestVariant- PlanValuesByProgrammeAndPlanningVersionQueryMessage_sync 56002 entity. The AppropriationRequestVariantPlanValuesByProgrammeAnd PlanningVersionQueryMessage_sync 56000 package includes a Selection 56006 package.

The Selection 56006 package is an AppropriationRequestVariantPlanValuesSelectionByProgrammeAndPlanningVersion 56012 datatype. The Selection 56006 package includes an AppropriationRequestVariantPlanValuesSelectionByProgrammeAndPlanningVersion 56008 entity.

The AppropriationRequestVariantPlanValuesSelectionByProgrammeAndPlanningVersion 56008 entity has a cardinality of one 56010 meaning that for each instance of the AppropriationRequestVariantPlanValuesByProgrammeAndPlanningVersionQueryMessage_sync 56002 entity there is one AppropriationRequestVariantPlanValuesSelectionByProgrammeAndPlanningVersion 56008 entity. The AppropriationRequestVariantPlanValuesSelectionByProgrammeAndPlanningVersion 56008 entity includes various attributes, namely ProgrammeDefinitionID 56014, ApprovalFiscalYearID 56020, ProgrammeID 56026 and PlanningVersionCode 56032.

The ProgrammeDefinitionID 56014 attribute is a ProgrammeDefinitionID 56018 datatype. The ProgrammeDefinitionID 56014 attribute has a cardinality of one 56016 meaning that for each instance of the AppropriationRequestVariantPlanValuesSelectionByProgrammeAndPlanningVersion 56008 entity there is one ProgrammeDefinitionID 56014 attribute.

The ApprovalFiscalYearID 56020 attribute is an ApprovalFiscalYearID 56024 datatype. The ApprovalFiscalYearID 56020 attribute has a cardinality of one 56022 meaning that for each instance of the AppropriationRequestVariantPlanValuesSelectionByProgrammeAndPlanningVersion 56008 entity there is one ApprovalFiscalYearID 56020 attribute.

The ProgrammeID 56026 attribute is a ProgrammeID 56030 datatype. The ProgrammeID 56026 attribute has a cardinality of one 56028 meaning that for each instance of the AppropriationRequestVariantPlanValuesSelectionByProgrammeAndPlanningVersion 56008 entity there is one ProgrammeID 56026 attribute.

The PlanningVersionCode 56032 attribute is an AccountingPlanningVersionCode 56036 datatype. The PlanningVersionCode 56032 attribute has a cardinality of one 56034 meaning that for each instance of the AppropriationRequestVariantPlanValuesSelectionByProgrammeAndPlanningVersion 56008 entity there is one PlanningVersionCode 56032 attribute.

Selection Package

The Selection package includes the AppropriationRequestVariantPlanValuesSelectionByProgrammeAndPlanningVersion entity.

AppropriationRequestVariantPlanValues SelectionByProgrammeAndPlanningVersion

AppropriationRequestVariantPlanValuesSelectionByProgrammeAndPlanningVersion groups the selection criteria. A ProgrammeDefinitionID is an unique identifier for a ProgrammeDefinition. A ProgrammeDefinition is a group of programmes with the same or a similar purpose (e.g. investment or maintenance). A FiscalYearID is the numerical value that designates a fiscal year. A fiscal year (business year) is a specific period of time designated by a numerical year value for which the profit and loss of a company is regularly accounted (inventory and balance sheet). ApprovalFiscalYearID is the fiscal year in which a Programme is approved. ProgrammeID is an identifier for a Programme. A Programme is an organizational center for administrating a group of projects or subprograms. Programme represents a complex, time restricted endeavor for reaching higher-level goals within a far-reaching strategy within a set of Programmes specified by a combination of ProgrammeDefinitionID and ApprovalFiscalYearID. The ProgrammeID is a unique identifier for a Programme. AccountingPlanningVersionCode is a coded representation of a planning version used in Accounting. A planning version is a valuation view on planned costs or revenues in Accounting.

Message Data Type

The message data type AppropriationRequestVariantPlanValuesByProgrammeAndPlanningVersionResponseMessage_sync includes the AppropriationRequest and its variant to be approved included in the business document and a log. FIGS. 57-1 through 57-3 show an AppropriationRequestVariantPlanValuesByProgrammeAndPlanningVersionResponseMessage_sync 57000 package. The AppropriationRequestVariantPlanValuesByProgrammeAndPlanningVersionResponseMessage_sync 57000 package is an AppropriationRequestVariantPlanValuesByProgrammeAndPlanningVersionResponseMessage_sync 57004 datatype. The AppropriationRequestVariantPlanValuesByProgrammeAndPlanningVersionResponseMessage_sync 57000 package includes an AppropriationRequestVariantPlanValuesByProgrammeAndPlanningVersionResponseMessage_sync 57002 entity. The AppropriationRequestVariantPlanValuesByProgrammeAndPlanningVersionResponseMessage_sync 57000 package includes various packages, namely AppropriationRequest 57006 and Log 57096.

The AppropriationRequest 57006 package is an AppropriationRequest 57012 datatype. The AppropriationRequest 57006 package includes an AppropriationRequest 57008 entity. The AppropriationRequest 57006 package includes a Variant 57038 package.

The AppropriationRequest 57008 entity has a cardinality of zero or n 57010 meaning that for each instance of the AppropriationRequestVariantPlanValuesByProgrammeAndPlanningVersionResponseMessage_sync 57002 entity there may be one or more AppropriationRequest 57008 entities. The AppropriationRequest 57008 entity includes various attributes, namely ID 57014, Description 57020, ApprovalStatusCode 57026 and ApprovalStatusName 57032.

The ID 57014 attribute is an AppropriationRequestID 57018 datatype. The ID 57014 attribute has a cardinality of one 57016 meaning that for each instance of the AppropriationRequest 57008 entity there is one ID 57014 attribute.

The Description 57020 attribute is a MEDIUM_Description 57024 datatype. The Description 57020 attribute has a cardinality of zero or one 57022 meaning that for each instance of the AppropriationRequest 57008 entity there may be one Description 57020 attribute.

The ApprovalStatusCode 57026 attribute is an ApprovalStatusCode 57030 datatype. The ApprovalStatusCode 57026 attribute has a cardinality of one 57028 meaning that for each instance of the AppropriationRequest 57008 entity there is one ApprovalStatusCode 57026 attribute.

The ApprovalStatusName 57032 attribute is a MEDIUM_Name 57036 datatype. The ApprovalStatusName 57032 attribute has a cardinality of one 57034 meaning that for each instance of the AppropriationRequest 57008 entity there is one ApprovalStatusName 57032 attribute.

The Variant 57038 package is a Variant 57044 datatype. The Variant 57038 package includes a Variant 57040 entity. The Variant 57038 package includes a PlanValues 57058 package.

The Variant 57040 entity has a cardinality of one 57042 meaning that for each instance of the AppropriationRequest 57008 entity there is one Variant 57040 entity. The Variant 57040 entity includes various attributes, namely ID 57046 and Description 57052.

The ID 57046 attribute is an AppropriationRequestVariantID 57050 datatype. The ID 57046 attribute has a cardinality of one 57048 meaning that for each instance of the Variant 57040 entity there is one ID 57046 attribute.

The Description 57052 attribute is a MEDIUM_Description 57056 datatype. The Description 57052 attribute has a cardinality of zero or one 57054 meaning that for each instance of the Variant 57040 entity there may be one Description 57052 attribute.

The PlanValues 57058 package is a PlanValues 57064 datatype. The PlanValues 57058 package includes a PlanValues 57060 entity.

The PlanValues 57060 entity has a cardinality of zero or n 57062 meaning that for each instance of the Variant 57040 entity there may be one or more PlanValues 57060 entities. The PlanValues 57060 entity includes various attributes, namely FiscalYearDependencyIndicator 57066, FiscalYearID 57072, InvestmentAmount 57078, OverheadAmount 57084 and RevenueAmount 57090.

The FiscalYearDependencyIndicator 57066 attribute is an Indicator 57070 datatype. The FiscalYearDependencyIndicator 57066 attribute has a cardinality of zero or one 57068 meaning that for each instance of the PlanValues 57060 entity there may be one FiscalYearDependencyIndicator 57066 attribute.

The FiscalYearID 57072 attribute is a FiscalYearID 57076 datatype. The FiscalYearID 57072 attribute has a cardinality of zero or one 57074 meaning that for each instance of the PlanValues 57060 entity there may be one FiscalYearID 57072 attribute.

The InvestmentAmount 57078 attribute is an Amount 57082 datatype. The InvestmentAmount 57078 attribute has a cardinality of zero or one 57080 meaning that for each instance of the PlanValues 57060 entity there may be one InvestmentAmount 57078 attribute.

The OverheadAmount 57084 attribute is an Amount 57088 datatype. The OverheadAmount 57084 attribute has a cardinality of zero or one 57086 meaning that for each instance of the PlanValues 57060 entity there may be one OverheadAmount 57084 attribute.

The RevenueAmount 57090 attribute is an Amount 57094 datatype. The RevenueAmount 57090 attribute has a cardinality of zero or one 57092 meaning that for each instance of the PlanValues 57060 entity there may be one RevenueAmount 57090 attribute.

The Log 57096 package is a Log 57102 datatype. The Log 57096 package includes a Log 57098 entity.

The Log 57098 entity has a cardinality of one 57100 meaning that for each instance of the AppropriationRequestVariantPlanValuesByProgrammeAnd-PlanningVersionResponseMessage_sync 57002 entity there is one Log 57098 entity.

AppropriationRequest Package

AppropriationRequest

An AppropriationRequest is an idea or wish for carrying out an investment measure or other type of measure, which has to be individually assessed and approved by one or more positions within an enterprise, primarily because of the high costs involved.

An appropriation request can relate to any number of measures, which initially incur costs but over the long term generate revenue or provide other benefits. (These measures can be capital investments, research and development projects, or large-scale maintenance and repairs, for example.)

ID is a unique identifier for an AppropriationRequest. Description (optional) is the description of the AppropriationRequest. ApprovalStatusCode is the coded representation of the approval status of an appropriation request. The ApprovalStatusCode may represent either not started (1), for approval (3), approved (4) or rejected (5). PriorityName is the name of the approval status of an appropriation request.

Variant Package

Variant

PlanValues Package

PlanValues

Message Data Type

The message data type AppropriationRequestApproveRequestMessage_sync includes the AppropriationRequest included in the business document. FIG. 47 shows an AppropriationRequestApproveRequestMessage_sync 47000 package. The AppropriationRequestApproveRequestMessage_sync 47000 package is an AppropriationRequestApproveRequestMessage_sync 47004 datatype. The AppropriationRequestApproveRequestMessage_sync 47000 package includes an AppropriationRequestApproveRequestMessage_sync 47002 entity. The AppropriationRequestApproveRequestMessage_sync 47000 package includes an AppropriationRequest 47006 package.

The AppropriationRequest 47006 package is an AppropriationRequest 47012 datatype. The AppropriationRequest 47006 package includes an AppropriationRequest 47008 entity.

The AppropriationRequest 47008 entity has a cardinality of one 47010 meaning that for each instance of the AppropriationRequestApproveRequestMessage_sync 47002 entity there is one AppropriationRequest 47008 entity. The AppropriationRequest 47008 entity includes an ID 47014 attribute.

The ID 47014 attribute is an AppropriationRequestID 47018 datatype. The ID 47014 attribute has a cardinality of one 47016 meaning that for each instance of the AppropriationRequest 47008 entity there is one ID 47014 attribute.

AppropriationRequest Package

AppropriationRequest

An AppropriationRequest is an idea or wish for carrying out an investment measure or other type of measure, which has to be individually assessed and approved by one or more positions within an enterprise, primarily because of the high costs involved.

An appropriation request can relate to any number of measures, which initially incur costs but over the long term generate revenue or provide other benefits. (These measures can be capital investments, research and development projects, or large-scale maintenance and repairs, for example.)

ID is a unique identifier for an AppropriationRequest.

Message Data Type

The message data type AppropriationRequestApproveConfirmationMessage includes the AppropriationRequest included in the business document and a log. FIG. 46 shows an AppropriationRequestApprove- ConfirmationMessage_sync 46000 package. The AppropriationRequestApproveConfirmationMessage_sync 46000 package is an AppropriationRequestApproveRequestMessage_sync 46004 datatype. The AppropriationRequestApproveConfirmationMessage_sync 46000 package includes an AppropriationRequestApproveConfirmationMessage 46002 entity. The AppropriationRequestApproveConfirmationMessage_sync 46000 package includes various packages, namely AppropriationRequest 46006 and Log 46020.

The AppropriationRequest 46006 package is an AppropriationRequest 46012 datatype. The AppropriationRequest 46006 package includes an AppropriationRequest 46008 entity.

The AppropriationRequest 46008 entity has a cardinality of zero or one 46010 meaning that for each instance of the AppropriationRequestApproveConfirmationMessage 46002 entity there may be one AppropriationRequest 46008 entity. The AppropriationRequest 46008 entity includes an ID 46014 attribute.

The ID 46014 attribute is an AppropriationRequestID 46018 datatype. The ID 46014 attribute has a cardinality of one 46016 meaning that for each instance of the AppropriationRequest 46008 entity there is one ID 46014 attribute.

The Log 46020 package is a Log 46026 datatype. The Log 46020 package includes a Log 46022 entity.

The Log 46022 entity has a cardinality of one 46024 meaning that for each instance of the AppropriationRequestApproveConfirmationMessage 46002 entity there is one Log 46022 entity.

AppropriationRequest Package

AppropriationRequest

An AppropriationRequest is an idea or wish for carrying out an investment measure or other type of measure, which has to be individually assessed and approved by one or more positions within an enterprise, primarily because of the high costs involved.

An appropriation request can relate to any number of measures, which initially incur costs but over the long term generate revenue or provide other benefits. (These measures can be capital investments, research and development projects, or large-scale maintenance and repairs, for example.)

Message Data Type

The message data type AppropriationRequestRejectRequestMessage_sync includes the AppropriationRequest included in the business document. FIG. 53 shows an AppropriationRequestRejectRequestMessage_sync 53000 package. The AppropriationRequestRejectRequestMessage_sync 53000 package is an AppropriationRequestRejectRequestMessage_sync 53004 datatype. The AppropriationRequestRejectRequestMessage_sync 53000 package includes an AppropriationRequestRejectRequestMessage_sync 53002 entity. The AppropriationRequestRejectRequestMessage_sync 53000 package includes an AppropriationRequest 53006 package.

The AppropriationRequest 53006 package is an AppropriationRequest 53012 datatype. The AppropriationRequest 53006 package includes an AppropriationRequest 53008 entity.

The AppropriationRequest 53008 entity has a cardinality of one 53010 meaning that for each instance of the AppropriationRequestRejectRequestMessage_sync 53002 entity there is one AppropriationRequest 53008 entity. The AppropriationRequest 53008 entity includes an ID 53014 attribute.

The ID 53014 attribute is an AppropriationRequestID 53018 datatype. The ID 53014 attribute has a cardinality of one 53016 meaning that for each instance of the AppropriationRequest 53008 entity there is one ID 53014 attribute.

AppropriationRequest Package

Message Data Type

The message data type AppropriationRequestRejectConfirmationMessage_sync includes the AppropriationRequest included in the business document and a log. FIG. 52 shows an AppropriationRequestRejectConfirmationMessage_sync 52000 package. The AppropriationRequestRejectConfirmationMessage_sync 52000 package is an AppropriationRequestRejectRequestMessage_sync 52004 datatype. The AppropriationRequestRejectConfirmationMessage_sync 52000 package includes an AppropriationRequestRejectConfirmationMessage_sync 52002 entity. The AppropriationRequestRejectConfirmationMessage_sync 52000 package includes various packages, namely AppropriationRequest 52006 and Log 52020.

The AppropriationRequest 52006 package is an AppropriationRequest 52012 datatype. The AppropriationRequest 52006 package includes an AppropriationRequest 52008 entity.

The AppropriationRequest 52008 entity has a cardinality of zero or one 52010 meaning that for each instance of the AppropriationRequestRejectConfirmationMessage_sync 52002 entity there may be one AppropriationRequest 52008 entity. The AppropriationRequest 52008 entity includes an ID 52014 attribute.

The ID 52014 attribute is an AppropriationRequestID 52018 datatype. The ID 52014 attribute has a cardinality of one 52016 meaning that for each instance of the AppropriationRequest 52008 entity there is one ID 52014 attribute.

The Log 52020 package is a Log 52026 datatype. The Log 52020 package includes a Log 52022 entity.

The Log 52022 entity has a cardinality of one 52024 meaning that for each instance of the AppropriationRequestRejectConfirmationMessage_sync 52002 entity there is one Log 52022 entity.

AppropriationRequest Package

Message Data Type

The message data type AppropriationRequestPostponeRequestMessage_sync includes the AppropriationRequest included in the business document. FIG. 51 shows an AppropriationRequestPostponeRequestMessage_sync 51000 package. The AppropriationRequestPostponeRequestMessage_sync 51000 package is an AppropriationRequestPostponeRequestMessage_sync 51004 datatype. The AppropriationRequestPostponeRequestMessage_sync 51000 package includes an AppropriationRequestPostponeRequestMessage__sync 51002 entity. The AppropriationRequestPostponeRequestMessage_sync 51000 package includes an AppropriationRequest 51006 package.

The AppropriationRequest 51006 package is an AppropriationRequest 51012 datatype. The AppropriationRequest 51006 package includes an AppropriationRequest 51008 entity.

The AppropriationRequest 51008 entity has a cardinality of one 51010 meaning that for each instance of the AppropriationRequestPostponeRequestMessage_sync 51002 entity there is one AppropriationRequest 51008 entity. The AppropriationRequest 51008 entity includes an ID 51014 attribute.

The ID 51014 attribute is an AppropriationRequestID 51018 datatype. The ID 51014 attribute has a cardinality of one 51016 meaning that for each instance of the AppropriationRequest 51008 entity there is one ID 51014 attribute.

AppropriationRequest Package

Message Data Type

The message data type AppropriationRequestPostponeConfirmationMessage_sync includes the AppropriationRequest included in the business document and a log. FIG. 50 shows an AppropriationRequestPostponeConfirmationMessage_sync 50000 package. The AppropriationRequestPostponeConfirmationMessage_sync 50000 package is an AppropriationRequestPostponeRequestMessage_sync 50004 datatype. The AppropriationRequestPostponeConfirmationMessage_sync 50000 package includes an AppropriationRequestPostponeConfirmationMessage_sync 50002 entity. The AppropriationRequestPostponeConfirmationMessage_sync 50000 package includes various packages, namely AppropriationRequest 50006 and Log 50020.

The AppropriationRequest 50006 package is an AppropriationRequest 50012 datatype. The AppropriationRequest 50006 package includes an AppropriationRequest 50008 entity.

The AppropriationRequest 50008 entity has a cardinality of zero or one 50010 meaning that for each instance of the AppropriationRequestPostponeConfirmationMessage_sync 50002 entity there may be one AppropriationRequest 50008 entity. The AppropriationRequest 50008 entity includes an ID 50014 attribute.

The ID 50014 attribute is an AppropriationRequestID 50018 datatype. The ID 50014 attribute has a cardinality of one 50016 meaning that for each instance of the AppropriationRequest 50008 entity there is one ID 50014 attribute.

The Log 50020 package is a Log 50026 datatype. The Log 50020 package includes a Log 50022 entity.

The Log 50022 entity has a cardinality of one 50024 meaning that for each instance of the AppropriationRequestPostponeConfirmationMessage_sync 50002 entity there is one Log 50022 entity.

Business Process Internal Control Interfaces

Within the Management of Internal Controls not only the documentation of all existing controls within one company is requested, but also to test and assess the completeness and correctness of those controls. Most of those controls belong to a business process internal control. To perform the assessment of those controls certain information about the business process internal control is fundamental. Therefore the data of the business process internal control can be requested from external audit systems.

Message Choreography

Figure 58:
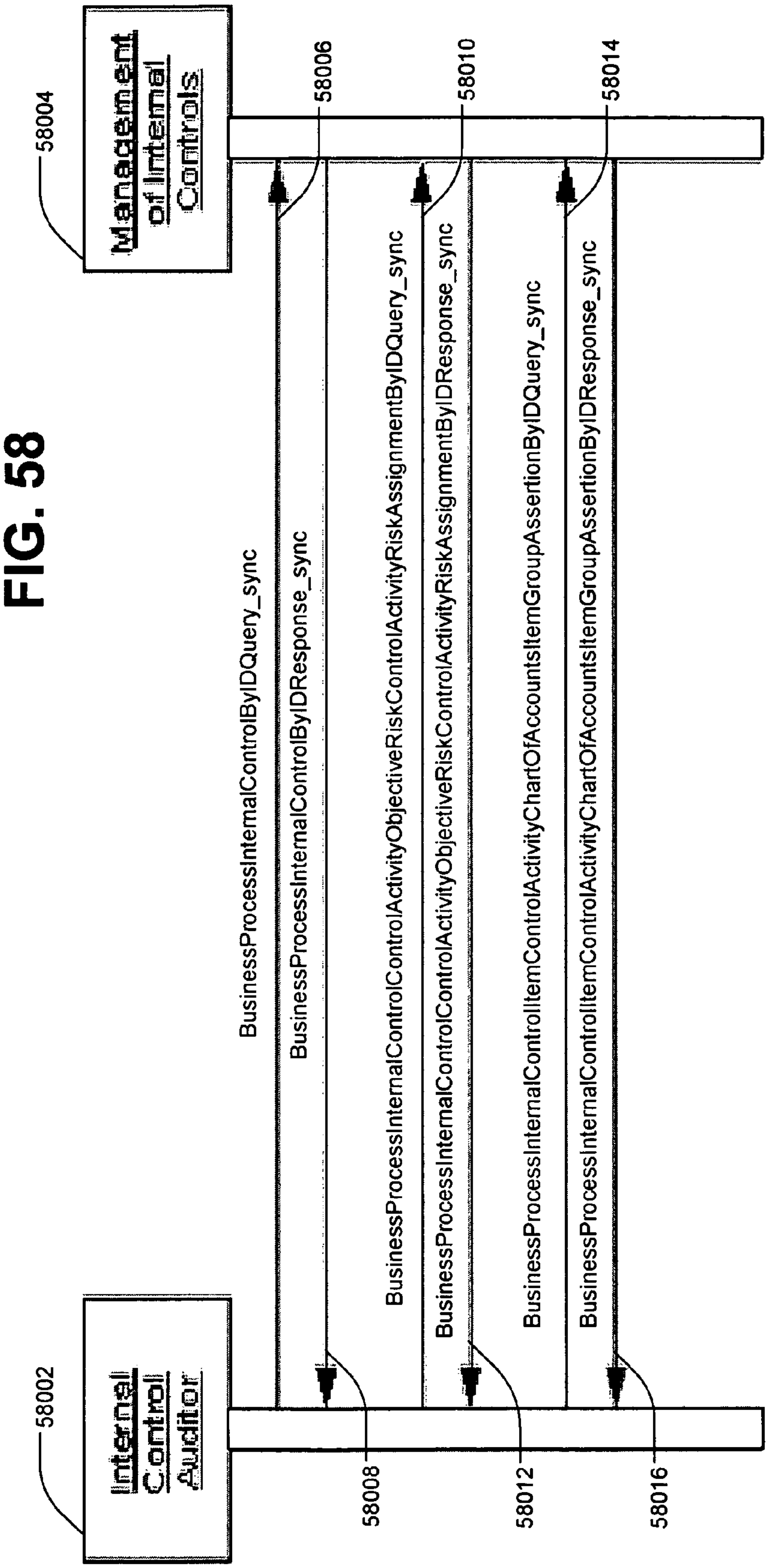
FIG. 58 shows an example BusinessProcessInternalControl Message Choreography.

The message choreography of FIG. 58 describes a possible logical sequence of messages that can be used to realize a business process internal control business scenario.

A BusinessProcessInternalControlByIDQuery_sync is the inquiry to the Management of Internal Controls about a BusinessProcessInternalControl. The structure of the message type BusinessProcessInternalControlByIDQuery_sync is specified by the message data type BusinessProcessInternalControlByIDQueryMessage_sync.

A BusinessProcessInternalControlByIDResponse_sync is the response to a BusinessProcessInternalControlByIDQuery_sync. The structure of the message type BusinessProcessInternalControlByIDResponse_sync is specified by the message data type BusinessProcessInternalControlByIDResponseMessage_sync.

A BusinessProcessInternalControlControlActivityObjectiveRiskControlActivityRiskAssignmentByIDQuery_sync is the inquiry to the Management of internal control about the assignments between the business process internal control and the control activity objective and its risks, as well as about the assignments between the control activity and the control activity objective risks. The structure of the message type BusinessProcessInternalControlControlActivityObjectiveRiskControlActivityRiskAssignmentByIDQuery_sync is specified by the message data type BusinessProcessInternalControlControlActivityObjectiveRiskControlActivityRiskAssignmentByIDQueryMessage_sync.

A BusinessProcessInternalControlControlActivityObjectiveRiskControlActivityRiskAssignmentByIDResponse_sync is the response to the BusinessProcessInternalControlControlActivityObjectiveRiskControlActivityRiskAssignmentByIDQuery_sync. The structure of the message type BusinessProcessInternalControlControlActivityObjectiveRiskControlActivityRiskAssignmentByIDResponse_sync is specified by the message data type BusinessProcessInternalControlControlActivityObjectiveRiskControlActivityRiskAssignmentByIDResponseMessage_sync.

A BusinessProcessInternalControlItemControlActivityChartOfAccountsItemGroupAssertionByIDQuery_sync is the inquiry to the Management of internal control about the assignments between the business process internal control and the chart of accounts item group assertion, as well as about the assignments between the chart of accounts item group assertion and the control activity. The structure of the message type BusinessProcessInternalControlItemControlActivityChartOfAccountsItemGroupAssertionByIDQuery_sync is specified by the message data type BusinessProcessInternalControlItemControlActivityChartOfAccountsItemGroupAssertionByIDQueryMessage_sync.

A BusinessProcessInternalControlItemControlActivityChartOfAccountsItemGroupAssertionByIDResponse_sync is the response to the BusinessProcessInternalControlItemControlActivityChartOfAccountsItemGroupAssertionByIDQuery_sync. The structure of the message type BusinessProcessInternalControlItemControlActivityChartOfAccountsItemGroupAssertionByIDResponse_sync is specified by the message data type BusinessProcessInternalControlItemControlActivityChartOfAccountsItemGroupAssertionByIDResponseMessage_sync.

Figure 59:
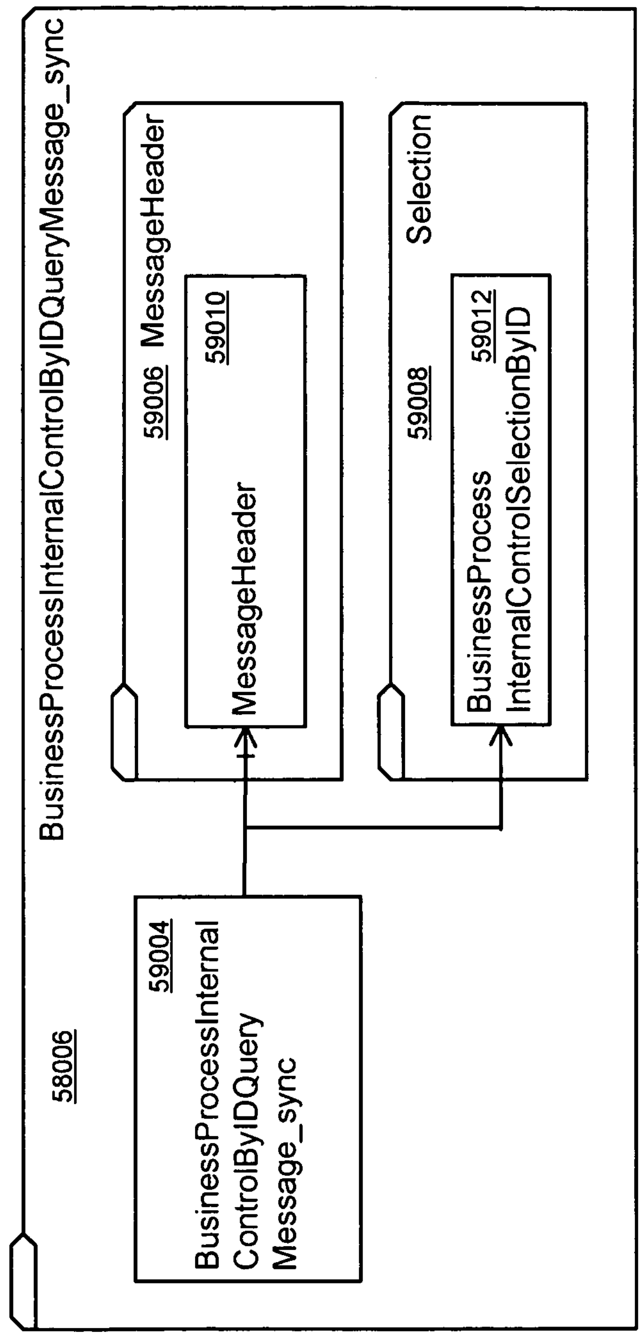
FIG. 59 shows an example BusinessProcessInternalControlByIDQueryMessage_sync Message Data Type.

For example, an "Internal Control Auditor" system 58002 can query a business process internal control by ID using the BusinessProcessInternalControlByIDQuery_sync message 58006 as shown, for example, in FIG. 59. A "Management of Internal Controls" system 58004 can respond to the query using the BusinessProcessInternalControlByIDResponse_sync message 58008 as shown, for example, in FIG. 60. The "Internal Control Auditor" system 58002 can query a business process internal control risk assignment by ID using the BusinessProcessInternalControlControlActivityObjectiveRiskControlActivityRiskAssignmentByIDQuery_sync message 58010 as shown, for example, in FIG. 61. The "Management of Internal Controls" system 58004 can respond to the query using the BusinessProcessInternalControlControlActivityObjectiv-eRiskControlActivityRiskAssignmentByIDResponse_sync message 58012 as shown, for example, in FIG. 62. The "Internal Control Auditor" system 58002 can query a business process internal control chart of accounts item group assertion by ID using the BusinessProcessInternalControlItemControlActivity-ChartOfAccountsItemGroupAssertionByIDQuery_sync message 58014 as shown, for example, in FIG. 63. The "Management of Internal Controls" system 58004 can respond to the query using the BusinessProcessInternalControlItemControlActivity-ChartOfAccountsItemGroupAssertionByIDResponse_sync message 58016 as shown, for example, in FIG. 64.

Message Data Type

The message data type BusinessProcessInternalControlByIDQueryMessage_sync 58006 of FIG. 59 contains the selection included in the business document and the business information that is relevant for sending a business document in a message. It contains a BusinessProcessInternalControlByIDQueryMessage_sync entity 59004 and packages MessageHeader 59006 and Selection 59008.

MessageHeader Package

The MessageHeader package 59006 groups the business information that is relevant for sending a business document in a message. It contains an entity MessageHeader 59010.

MessageHeader

The MessageHeader 59010 groups business information from the perspective of the sending application, such as information to identify the business document in a message. It is of type GDT: BasicBusinessDocumentMessageHeader, and uses the GDT elements ID and ReferenceID.

Selection Package

The Selection package 59008 collects all the selection criteria for the BusinessProcessInternalControlByID selection. It contains an entity BusinessProcessInternalControlSelectionByID 59012.

BusinessProcessInternalControlSelectionByID

The BusinessProcessInternalControlSelectionByID 59012 specifies the identifying elements to select a BusinessProcessInternalControl. The selection criteria elements located at BusinessProcessInternalControlSelectionByID are the BusinessProcessInternalControlID and the ValidityPeriod. The BusinessProcessInternalControlID is the identifier for the BusinessProcessInternalControl, and is of type GDT: BusinessProcessInternalControlID. The ValidityPeriod, which can be optional, is the period the BusinessProcessInternalControl is valid, and is of type GDT: DatePeriod with a Qualifier of Validity.

Message Data Type

Figure 60:
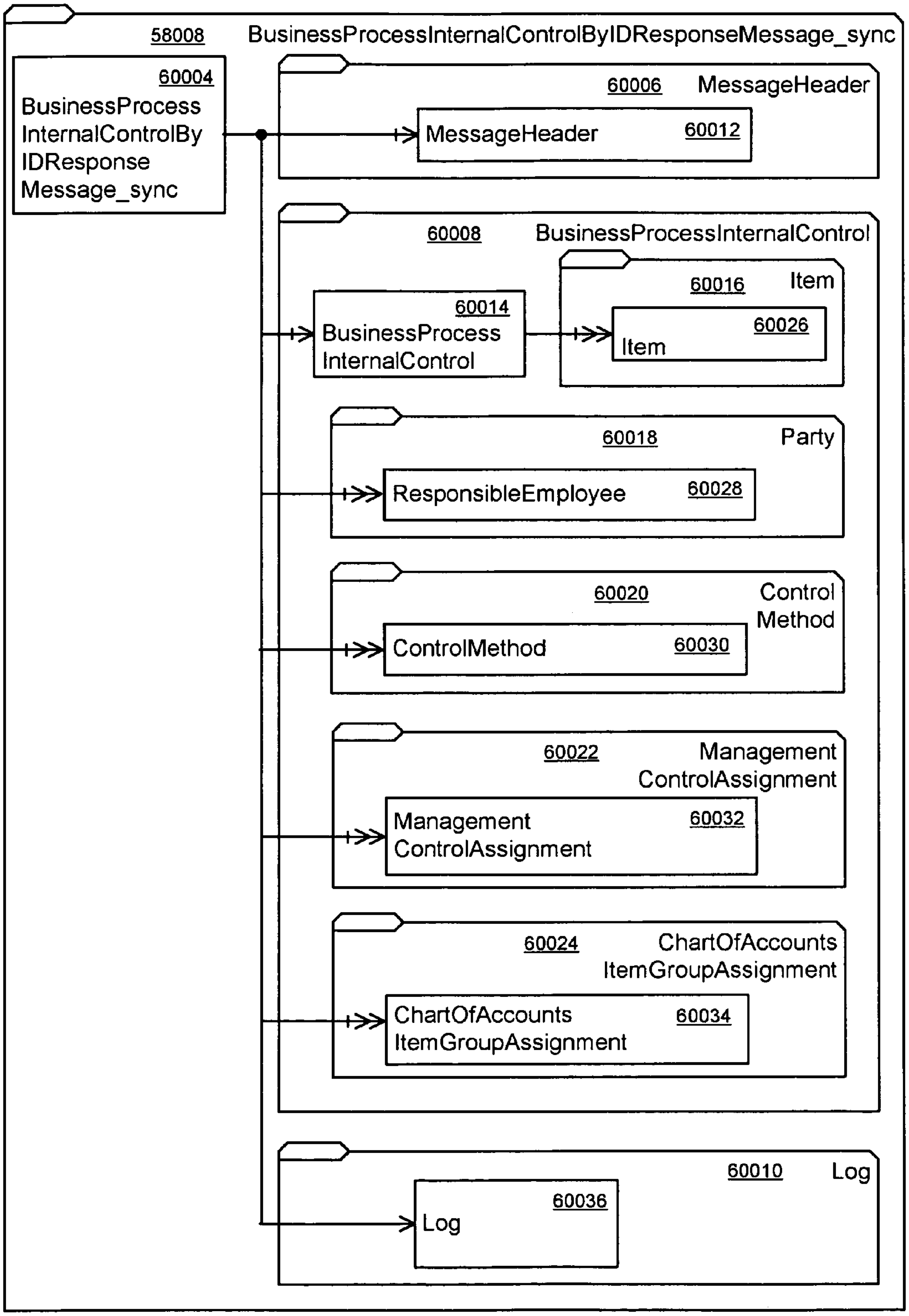
FIG. 60 shows an example BusinessProcessInternalControlByIDResponseMessage_sync Message Data Type.

The message data type BusinessProcessInternalControlByIDResponseMessage_sync 58008 of FIG. 60 contains the BusinessProcessInternalControl included in the business document and the business information that is relevant for sending a business document in a message. It contains an entity BusinessProcessInternalControlByIDResponseMessage_sync 60004 packages MessageHeader 60006, BusinessProcessInternalControl 60008 and Log 60010.

MessageHeader Package

The MessageHeader package 60006 groups the business information that is relevant for sending a business document in a message. It contains an entity MessageHeader 60012.

MessageHeader

The MessageHeader 60012 groups business information from the perspective of the sending application, such as information to identify the business document in a message. It is of type GDT: BasicBusinessDocumentMessageHeader, and uses the GDT elements ID and ReferenceID.

BusinessProcessInternalControl Package

The BusinessProcessInternalControl package 60008 contains the data of a business process internal control. It contains packages Item 60016, Party 60018, ControlMethod 60020, ManagementControlAssignment 60022, and ChartOfAccountsItemGroupAssignment 60024. It contains an entity BusinessProcessInternalControl 60014.

BusinessProcessInternalControl

The BusinessProcessInternalControl 60014 is the view on a business process under the aspect of internal control. Relevant for the internal control are only business processes which are directly or indirectly related either to the financial reporting or to disclosure controls and procedures. The elements located at a BusinessProcessInternalControl are a BusinessProcessInternalControlID, a BusinessProcessInternalControlName, a ReportingLineUnitName, a BusinessProcessInternalControlGroupID, a BusinessProcessInternalControlGroupName, a ValidityPeriod, and a DescriptionText. The BusinessProcessInternalControlID is the identifier for the BusinessProcessInternalControl, and is of type GDT: BusinessProcessInternalControlI. The BusinessProcessInternalControlName is the name of the BusinessProcessInternalControl, and is of type GDT: MEDIUM_Name. The ReportingLineUnitID is a unique identifier for an organizational unit, and is of type GDT: OrganisationalCentreID. The ReportingLineUnitName is the name of the ReportingLineUnit, and is of type GDT: MEDIUM_Name. Several business process internal controls are grouped together. The BusinessProcessInternalControlGroupID contains the identifier for the business process internal control group, and is of type GDT: BusinessProcessInternalControlGroupID. Several business process internal controls are grouped together. The BusinessProcessInternalControlGroupName contains the name of the business process internal control group, and is of type GDT: MEDIUM_Name. The ValidityPeriod, which can be optional, is the period the BusinessProcessInternalControl is valid, and is of type GDT: DatePeriod Qualifier: Validity. The DescriptionText describes the business process internal control, and is of type GDT: Text.

Item Package

The Item package 60016 groups all the elements containing the information about the items of a business process internal control. It contains an entity Item 60026.

Item

The Item entity 60026 is a step that is performed within the BusinessProcessInternalControl. The elements that are located at the Item are a BusinessProcessInternalControlItemID and a BusinessProcessInternalControlItemName. The BusinessProcessInternalControlItemID is the unique identifier for a BusinessProcessInternalControlItem, and is of type GDT: BusinessProcessInternalControlItemID. The BusinessProcessInternalControlItemName contains the name of the BusinessProcessInternalControlItem, and is of type GDT: MEDIUM_Name.

Party Package

The Party package 60018 comprises the group of natural persons, organization, or a group in which a company has a business or intra-enterprise interest. This could be a person, organization or group within or outside of the company. It contains an entity ResponsibleEmployee 60028.

ResponsibleEmployee

The ResponsibleEmployee entity 60028 comprises a person that is responsible for the documentation of the business process under the aspect of internal control. It is their duty to document the business process internal control and to assess the effectiveness and completeness of the business process internal control. The elements that are located at the ResponsibleEmployee are a RoleCode, a RoleCodeName, an InternalID, and a Name. The RoleCode is the coded representation of a BusinessPartnerRole, and is of type GDT: BusinessPartnerRoleCode. The RoleCodeName contains the name of the BusinessPartnerRoleCode, and is of type GDT: MEDIUM_Name. The InternalID is a unique proprietary identifier for a business partner who is the responsible of the BusinessProcessInternalControl, and is of type GDT: BusinessPartnerInternalID. The Name specifies the name of the responsible, and is of type GDT: PersonFormattedName.

ControlMethod Package

The ControlMethod package 60020 groups all the elements containing the information about the control methods that are used in the view of the business process. It contains an entity ControlMethod 60030.

ControlMethod

The ControlMethod entity 60030 describes the method to control the business process. The elements located at ControlMethod are a BusinessProcessIndustrialSectorCode, a BusinessProcessIndustrialSectorCodeName, a BusinessProcessSupervisoryCategoryCode, and a BusinessProcessSupervisoryCategoryCodeName. The BusinessProcessIndustrialSectorCode is the coded information of the industry sector to which a business process internal control belongs, and is of type GDT: BusinessProcessIndustrialSectorCode. The BusinessProcessIndustrialSectorCodeName is the name of the BusinessProcessIndustrialSectorCode, and is of type GDT: MEDIUM_Name. The BusinessProcessSupervisoryCategoryCode is the coded information of the BusinessProcessSupervisoryCategory. A BusinessProcessSupervisoryCategory is the required degree of supervisory by management or control activities defined by the type of execution in the business process and their associated inherent risk, and is of type GDT: BusinessProcessSupervisoryCategoryCode. The BusinessProcessSupervisoryCategoryCodeName is the name of the BusinessProcessSupervisoryCategoryCode, and is of type GDT: MEDIUM_Name.

ManagementControlAssignment Package

The ManagementControlAssignment package 60022 contains the data of the assignment between the business process internal control and the management control. It contains an entity ManagementControlAssignment 60032.

ManagementControlAssignment

The ManagementControlAssignment entity 60032 is the assignment between a business process internal control and a management control. Several business process internal controls can be assigned to management control and vice versa. The elements that are located at the ManagementControlAssignment are ManagementControlID and ManagementControlName. The ManagementControlID is a unique identifier for a ManagementControl. The ManagementControl is an activity with control purpose, which is performed independent from a single business process. Those control actions are located at the management level, and is of type GDT: ManagementControlID. The ManagementControlName is the name of the management control, and is of type GDT: MEDIUM_Name.

ChartOfAccountsItemGroupAssignment Package

The ChartOfAccountsItemGroupAssignment package 60024 contains the data of the assignment between the business process internal control and the chart of accounts item group. It contains an entity ChartOfAccountsItemGroupAssignment 60034.

ChartOfAccountsItemGroupAssignment

The ChartOfAccountsItemGroupAssignment entity 60034 is the assignment between the business process internal control and the chart of accounts item group. Each business process internal control is influencing one or several chart of accounts item groups. This assignment of the chart of accounts item groups is relevant for the assessment of the business process internal control. The elements that are located at the ChartOfAccountsItemGroupAssignment are ChartOfAccountsItemGroupID and ChartOfAccountsItemGroupName. A ChartOfAccountsItemGroupID is a unique identifier for a ChartOfAccountsItemGroup, and is of type GDT: ChartOfAccountsItemGroupID. The ChartOfAccountsItemGroupName is the name of the ChartOfAccountsItemGroup, and is of type GDT: MEDIUM_Name.

Log Package

The Log package 60010 groups the error messages used for user interaction. It contains a Log entity 60036.

Log

The Log entity 60036 is a sequence of messages that result when an application executes a task. The Log entity 60036 is of type GDT: Log.

Message Data Type

Figure 61:
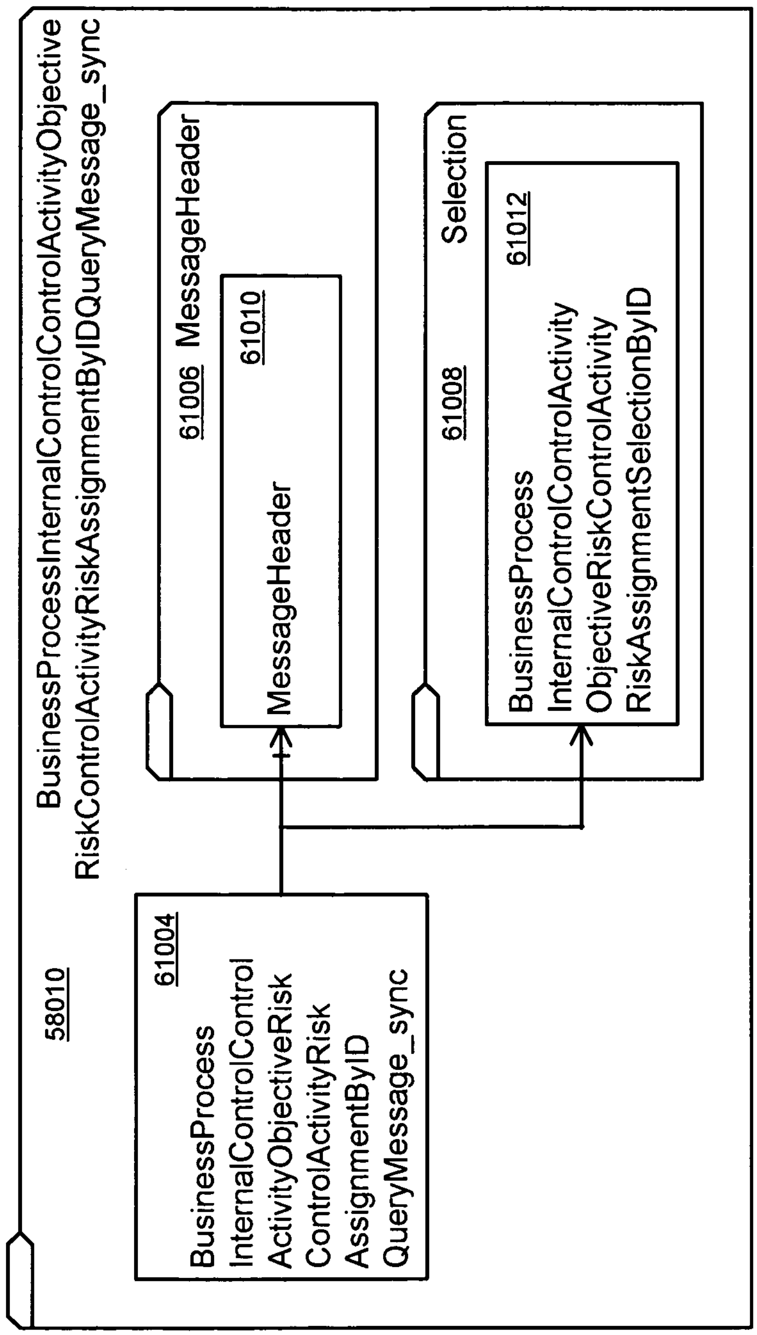
FIG. 61 shows an example BusinessProcessInternalControlControlActivityObjectiveRiskControlActivityRiskAssignmentByIDQueryMessage_sync Message Data Type.

The message data type BusinessProcessInternalControlControlActivityObjectiveRiskControlActivityRiskAssignmentByIDQueryMessage_sync 58010 of FIG. 61 contains the Selection included in the business document and the business information that is relevant for sending a business document in a message. It contains BusinessProcessInternalControlControlActivityObjectiveRiskControlActivityRiskAssignmentByID QueryMessage_sync entity 61004 and packages MessageHeader 61006 and Selection 61008.

MessageHeader Package

The MessageHeader package 61006 groups the business information that is relevant for sending a business document in a message. It contains entity MessageHeader 61010.

MessageHeader

The MessageHeader entity 61010 groups business information from the perspective of the sending application, such as information to identify the business document in a message. It is of type GDT: BasicBusinessDocumentMessageHeader, and uses GDT elements ID and ReferenceID.

Selection Package

The Selection package 61008 collects all the selection criteria for the BusinessProcessInternalControlControlActivityObjectiveRiskControlActivityRiskAssignmentByIDResponse. It contains an entity BusinessProcessInternalControlControlActivityObjectiveRiskControlActivityRiskAssignmentSelectionByID 61012.

BusinessProcessInternalControlControlActivityObjectiveRiskControlActivityRiskAssignmentSelectionByID The BusinessProcessInternalControlControlActivityObjectiveRiskControlActivityRiskAssignmentSelectionByID entity 61012 specifies the identifying elements to select a BusinessProcessInternalControlControlActivityObjectiveRiskControlActivityRiskAssignment. The selection criteria elements located at BusinessProcessInternalControlControlActivityObjectiveRiskControlActivityRiskAssignmentSelectionByID are BusinessProcessInternalControlID and ValidityPeriod. The BusinessProcessInternalControlID is the identifier for the BusinessProcessInternalControl, and is of type GDT: BusinessProcessInternalControlID. The ValidityPeriod, which can be optional, is the period the BusinessProcessInternalControl is valid, and is of type GDT: DatePeriod with a Qualifier of Validity.

Message Data Type

Figure 62:
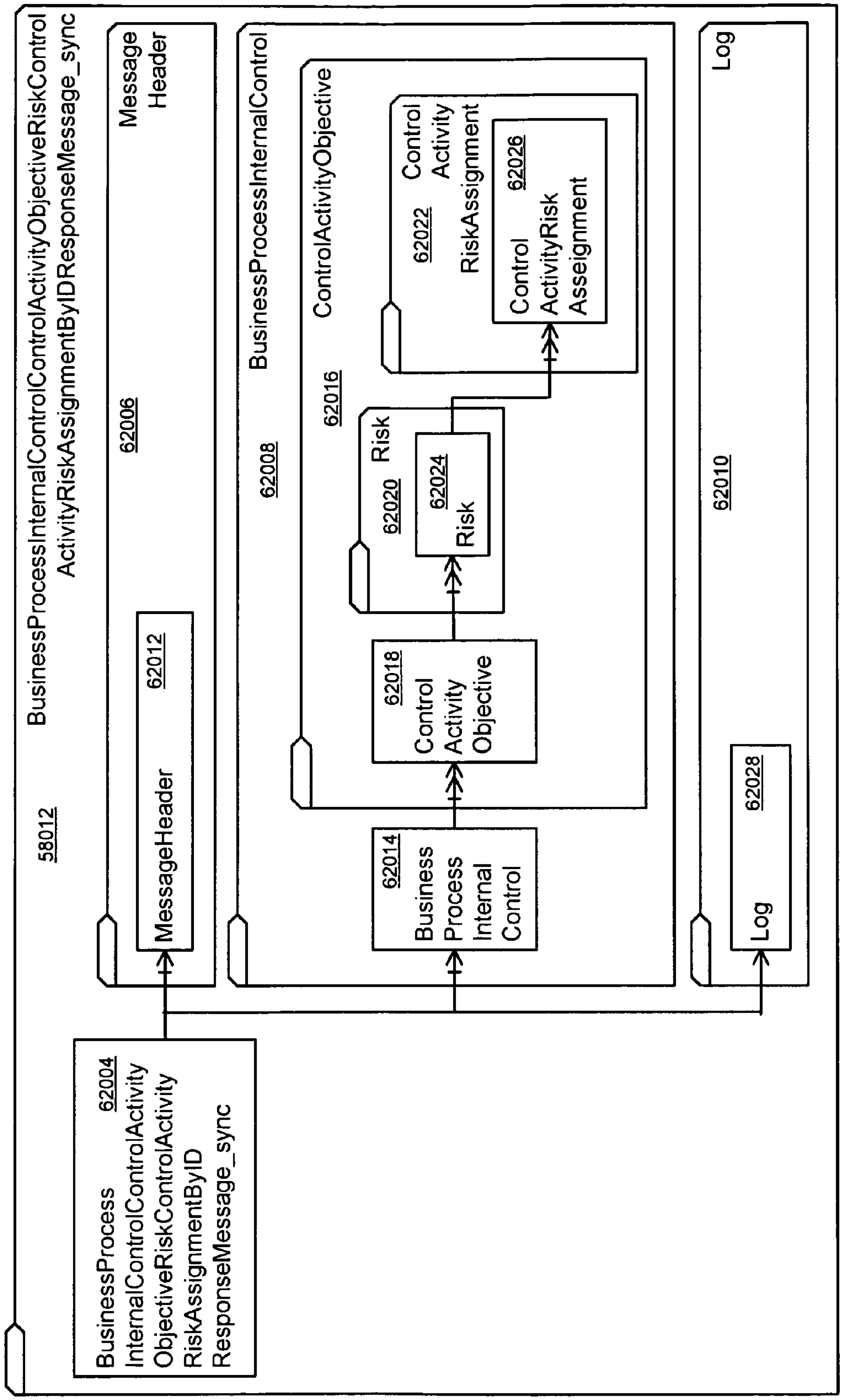
FIG. 62 shows an example BusinessProcessInternalControlControlActivityObjectiveRiskControlActivityRiskAssignmentByIDResponseMessage_sync Message Data Type.

The message data type BusinessProcessInternalControlControlActivityObjectiveRiskControlActivityRiskAssignmentByIDResponseMessage_sync 58012 of FIG. 62 contains the BusinessProcessInternalControl included in the business document and the business information that is relevant for sending a business document in a message. It contains entity BusinessProcessInternalControlControlActivityObjectiveRiskControlActivityRisk AssignmentByIDResponseMessage_sync 62004 and packages MessageHeader 62006, BusinessProcessInternalControl 62008, and Log 62010.

MessageHeader Package

The MessageHeader package 62006 groups the business information that is relevant for sending a business document in a message. It contains entity MessageHeader 62012.

MessageHeader

The MessageHeader 62012 groups business information from the perspective of the sending application, such as information to identify the business document in a message. It is of type GDT: BasicBusinessDocumentMessageHeader, and uses GDT elements ID and ReferenceID.

BusinessProcessInternalControl Package

The BusinessProcessInternalControl package 62008 contains the BusinessProcessInternalControl. It contains a package ControlActivityObjective 62016 and an entity BusinessProcessInternalControl 62014.

BusinessProcessInternalControl

The BusinessProcessInternalControl 62014 is the view on a business process under the aspect of internal control. Relevant for the internal control are only business processes which are directly or indirectly related either to the financial reporting or to disclosure controls and procedures. The elements located at the BusinessProcessInternalControl are BusinessProcessInternalControlID and BusinessProcessInternalControlName. The BusinessProcessInternalControlID is the identifier for the BusinessProcessInternalControl, and is of type GDT: BusinessProcessInternalControlID. The BusinessProcessInternalControlname is the name of the BusinessProcessInternalControl, and is of type GDT: MEDIUM_Name.

ControlActivityObjective Package

The ControlActivityObjective package 62016 groups the control activity objectives that are assigned to the BusinessProcessInternalControl. It contains the packages Risk 62020 and ControlActivityRiskAssignment 62022. It also contains entity ControlActivityObjective 62018.

ControlActivityObjective

The ControlActivityObjective 62018 describes the target of an activity with control purpose, for control activities that are performed within a business process internal control. A ControlActivityObjective includes risks, which can prevent the achievement of the targets of a control action. The elements located at the ControlActivityObjective are ControlActivityObjectiveID and ControlActivityObjectiveName. The ControlActivityObjectiveID contains the identifier for the control activity objective, and is of type GDT: ControlActivityObjectiveID. The ControlActivityObjectiveName is the title of the control activity objective, and is of type GDT: MEDIUM_Name.

Risk Package

The Risk package 62020 contains the ControlActivityObjectiveRisk. It contains an entity Risk 62024.

Risk

The Risk entity 62024 is an uncertain event or condition that, if occurs, has negative effect on the ControlActivityObjective. The elements located at the Risk are ControlActivityObjectiveRiskID and ControlActivityObjectiveRiskName. The ControlActivityObjectiveRiskID contains the identifier for the risk of a control activity objective, and is of type GDT: ControlActivityObjectiveRiskID. The ControlActivityObjectiveRiskName is the name of the risk of a control activity objective, and is of type GDT: MEDIUM_Name.

ControlActivityRiskAssignment Package

The ControlActivityRiskAssignment package 62022 contains assignment between the ControlActivity and the ControlActivityObjectiveRisk. It contains entity ControlActivityRiskAssignment 62026.

ControlActivityRiskAssignment

The ControlActivityRiskAssignment 62026 is the assignment between the ControlActivity and the ControlActivityObjectiveRisk. The elements located at the ControlActivityRiskAssignment are ControlActivityID and ControlActivityName. The ControlActivityID contains the identifier for the control activity, and is of type GDT: ControlActivityID. The ControlActivityName is the title of the control activity, and is of type GDT: MEDIUM_Name.

Log Package

The Log package 62010 groups the error messages used for user interaction. It contains an entity Log 62028.

Log

The Log entity 62028 is a sequence of messages that result when an application executes a task. The entity Log is of type GDT: Log.

Message Data Type

Figure 63:
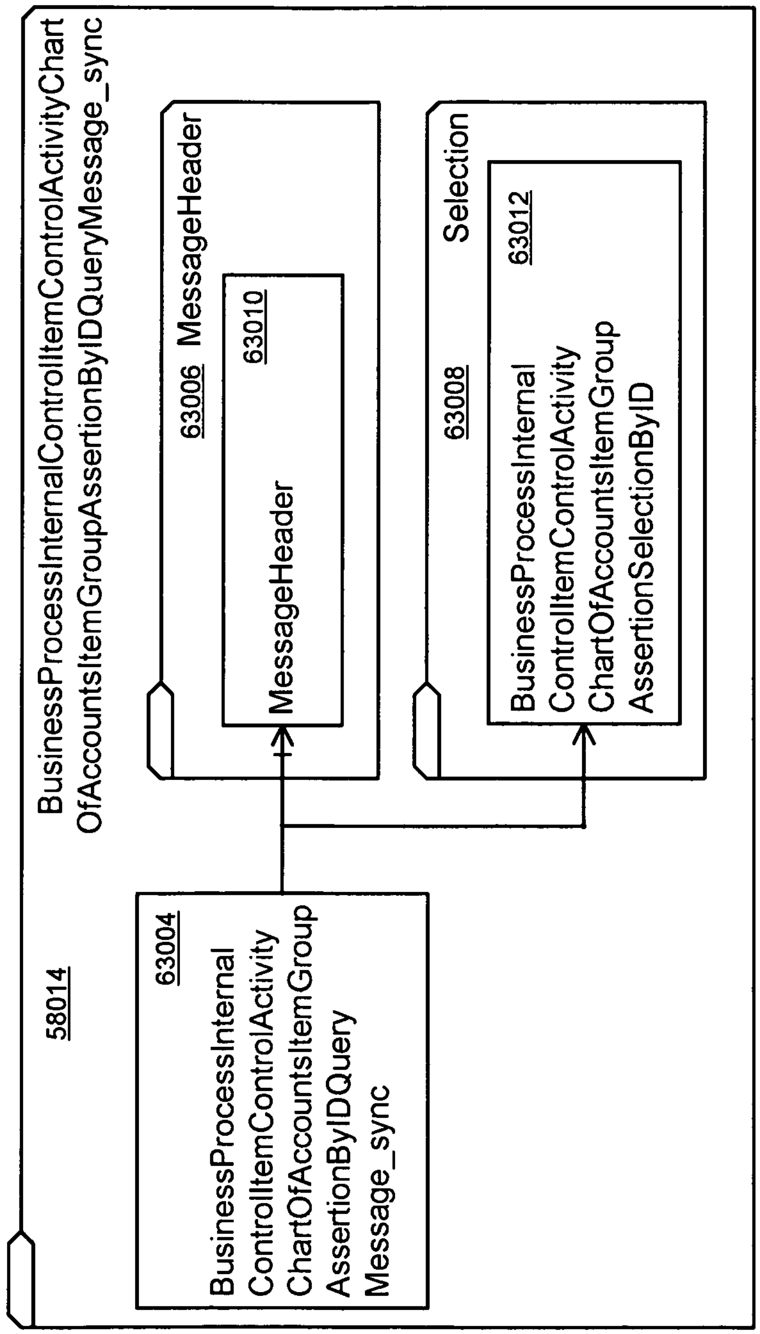
FIG. 63 shows an example BusinessProcessInternalControlItemControlActivityChartOfAccountsItemGroupAssertionByIDQueryMessage_sync Message Data Type.

The message data type BusinessProcessInternalControlItemControlActivityChartOfAccountsItemGroupAssertionByIDQueryMessage_sync 58014 of FIG. 63 contains the Selection included in the business document and the business information that is relevant for sending a business document in a message. It contains entity BusinessProcessInternalControlItemControlActivityChartOfAccountsItem GroupAssertionByIDQueryMessage_sync 63004 and packages MessageHeader 63006 and Selection 63008.

MessageHeader Package

The MessageHeader package 63006 groups the business information that is relevant for sending a business document in a message. It contains an entity MessageHeader 63010.

MessageHeader

The MessageHeader 63010 groups business information from the perspective of the sending application, such as information to identify the business document in a message. It is of type GDT: BasicBusinessDocumentMessageHeader, and uses GDT elements ID and ReferenceID.

Selection Package

The Selection package 63008 collects all the selection criteria for the BusinessProcessInternalControlItemControlActivityChartOfAccountsItemGroupAssertionByIDResponse. It contains package BusinessProcessInternalControlItemControlActivity- ChartOfAccountsItemGroupAssertionSelectionByID 63012.

BusinessProcessInternalControlItemControlActivity-ChartOfAccountsItemGroupAssertionSelectionByID The BusinessProcessInternalControlItemControlActivity-ChartOfAccountsItemGroupAssertionSelectionByID 63012 specifies the identifying elements to select a BusinessProcessInternalControl with its assignment to the ChartsOfAccountsItemGroupAssertion. The selection criteria elements located at BusinessProcessInternalControlItemControlActivity-ChartOfAccountsItemGroupAssertionSelectionByID are BusinessProcessInternalControlID and ValidityPeriod. The BusinessProcessInternalControlID is the identifier for the BusinessProcessInternalControl, and is of type GDT: BusinessProcessInternalControlID. The ValidityPeriod, which can be optional, is the period the BusinessProcessInternalControl is valid, and is of type GDT: DatePeriod with a Qualifier of Validity.

Message Data Type

Figure 64:
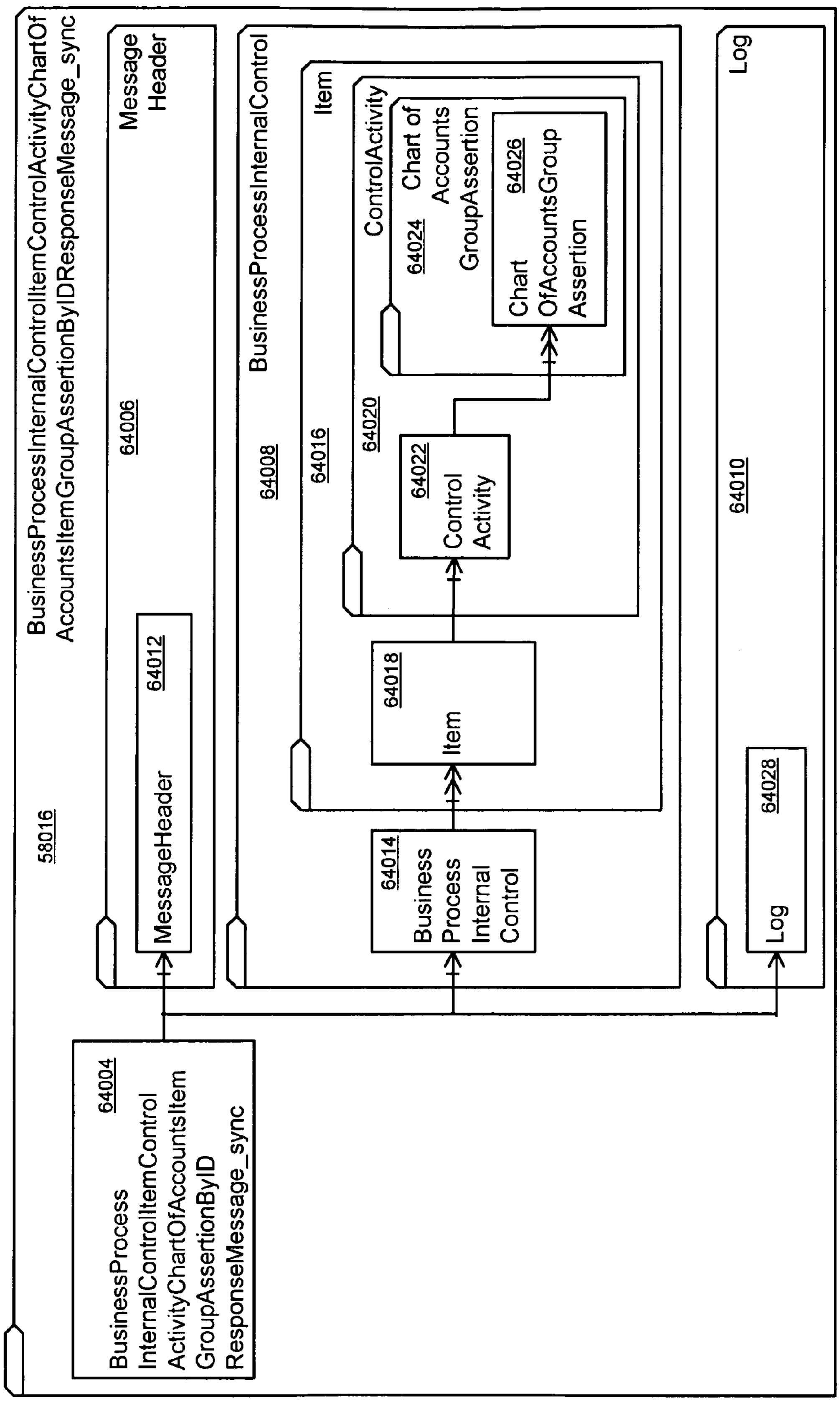
FIG. 64 shows an example BusinessProcessInternalControlItemControlActivityChartOfAccountsItemGroupAssertionByIDResponseMessage_sync Message Data Type.

The message data type BusinessProcessInternalControlItemControlActivity-ChartOfAccountsItemGroupAssertionByIDResponseMessage_sync 58016 of FIG. 64 contains the BusinessProcessInternalControl included in the business document and the business information that is relevant for sending a business document in a message. It contains entity BusinessProcessInternalControlItemControlActivityChartOfAccountsItemGroup AssertionByIDResponseMessage_sync 64004 and packages MessageHeader 64006, BusinessProcessInternalControl 64008, and Log 64010.

MessageHeader Package

The MessageHeader package 64006 groups the business information that is relevant for sending a business document in a message. It contains an entity MessageHeader 64012.

MessageHeader

The MessageHeader 64012 groups business information from the perspective of the sending application, such as information to identify the business document in a message. It is of type GDT: BasicBusinessDocumentMessageHeader, and uses GDT elements ID and ReferenceID.

BusinessProcessInternalControl Package

The BusinessProcessInternalControl 64008 package contains the BusinessProcessInternalControl. It contains package Item 64016 and the entity BusinessProcessInternalControl 64014.

BusinessProcessInternalControl

The BusinessProcessInternalControl 64014 is the view on a business process under the aspect of internal control. Relevant for the internal control are only business processes which are directly or indirectly related either to the financial reporting or to disclosure controls and procedures. The elements located at the BusinessProcessInternalControl are BusinessProcessInternalControlID and BusinessProcessInternalControlName. The BusinessProcessInternalControlID is the identifier for the BusinessProcessInternalControl, and is of type GDT: BusinessProcessInternalControlID. The BusinessProcessInternalControlname is the name of the BusinessProcessInternalControl, and is of type GDT: MEDIUM_Name.

Item Package

The Item 64016 groups all the elements containing the information about the items of a business process internal control. It contains package ControlActivity 64020 and the entity Item 64018.

Item

The Item 64018 is a step that is performed within the BusinessProcessInternalControl. The elements that are located at the Item are BusinessProcessInternalControlItemID and BusinessProcessInternalControlItemName. The BusinessProcessInternalControlItemID is the unique identifier for a BusinessProcessInternalControlItem, and is of type GDT: BusinessProcessInternalControlItemID. The BusinessProcessInternalControlItemName contains the name of the BusinessProcessInternalControlItem, and is of type GDT: MEDIUM_Name.

ControlActivity Package

The ControlActivityPackage 64020 package groups the control activities that are assigned to the BusinessProcessInternalControl. It contains package ChartOfAccountsItemGroupAssertion 64024 and the entity ControlActivity 64022.

ControlActivity

The ControlActivity 64022 is an action with control purpose, which is performed within a business process. The elements located directly at the ControlActivity are ControlActivityID and ControlActivityName. The ControlActivityID contains the identifier for the control activity, and is of type GDT: ControlActivityID. The ControlActivityName is the title of the control activity, and is of type GDT: MEDIUM_ Name.

ChartOfAccountsItemGroupAssertion Package

The ChartOfAccountsItemGroupAssertion package 64024 groups the assertions of a ChartOfAccountsItemGroup. It contains an entity ChartOfAccountsItemGroupAssertion.

ChartOfAccountsItemGroupAssertion

The Assertion 64026 is the conclusion the chart of accounts item group has to a financial statement. The elements located directly at the ChartOfAccountsItemGroupAssertion are ChartOfAccountsItemGroupID, ChartOfAccountsItemGroupName, AssertionCode, and AssertionCodeName. The ChartOfAccountsItemGroupID contains the identifier for a group of chart of accounts item, and is of type GDT: ChartOfAccountsItemID. The ChartOfAccountsItemGroupName is the name of the chart of accounts item group, and is of type GDT: MEDIUM_Name. The AssertionCode contains the coded representation of the assertion the chart of accounts item that is assigned to the control activity has to a financial statement in the Management of Internal Control, and is of type GDT: ControlActivityChartOfAccountsItemGroupAssertionCode. The AssertionCodeName is the name of the AssertionCode, and is of type GDT: MEDIUM_ Name.

Log Package

The Log package 64010 groups the error messages used for user interaction. It contains an entity Log 64028.

Log

The Log 64028 is a sequence of messages that result when an application executes a task. The entity Log is of type GDT: Log.

CapacityLoadPlanningView Interfaces

CapacityLoadPlanningView can be queried by the supply chain planner to get the capacity load of a resource from Supply and Demand Matching to analyze overload situations and carry out rescheduling.

Message Choreography

Figure 65:
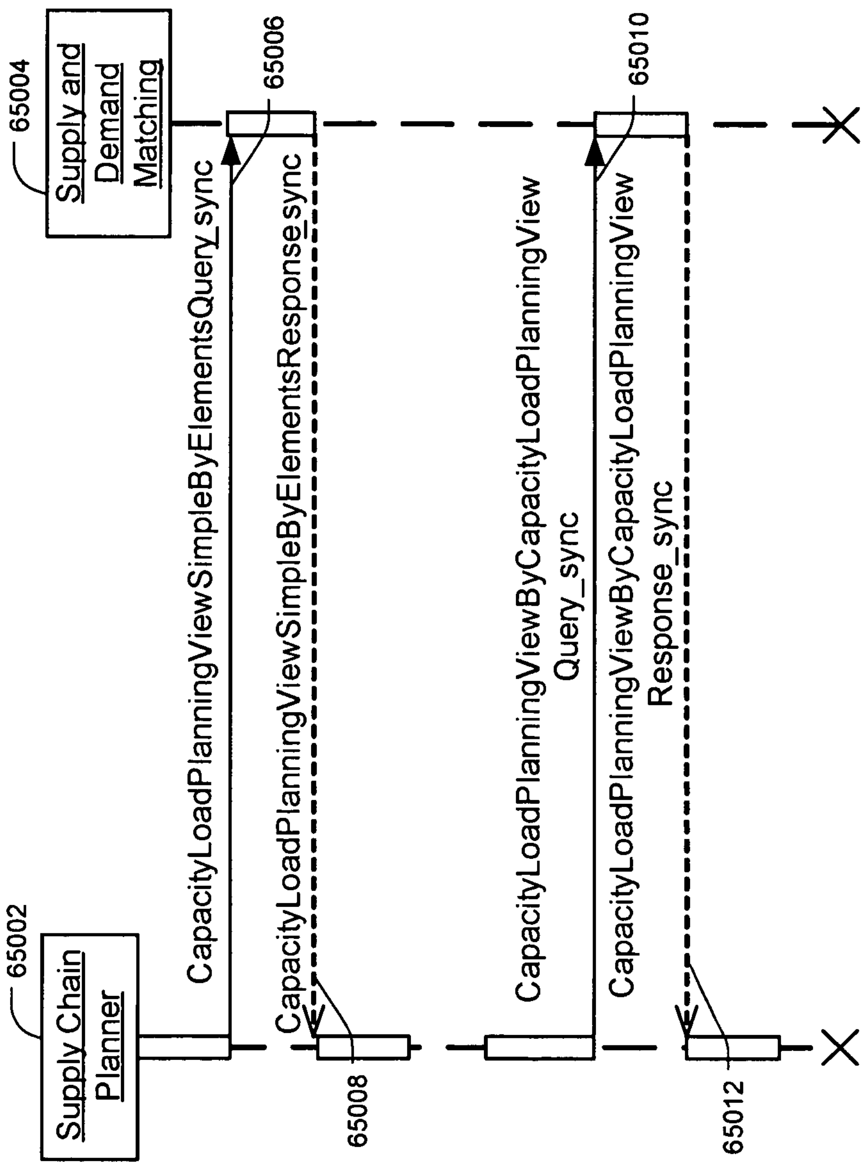
FIG. 65 shows an example CapacityLoadPlanningView Message Choreography.

The message choreography of FIG. 65 describes a possible logical sequence of messages that can be used to realize a capacity load planning view business scenario. CapacityLoadPlanningViewSimpleByElementsQuery_sync is an inquiry to Supply and Demand Matching to get the capacity load of a specified set of resources over a given period of time. The structure of the message type CapacityLoadPlanningViewSimpleByElementsQuery_sync is specified by the message data type CapacityLoadPlanningViewSimpleByElementsQueryMessage_sync.

CapacityLoadPlanningViewSimpleByElementsResponse_sync is the response to a CapacityLoadPlanningViewSimpleByElementsQuery_sync. The structure of the message type CapacityLoadPlanningViewSimpleByElementsResponse_sync is specified by the message data type CapacityLoadPlanningViewSimpleByElementsResponseMessage_sync.

CapacityLoadPlanningViewByCapacityLoadPlanningViewQuery_sync is an inquiry to Supply and Demand Matching to get the CapacityLoadPlanningView of a given resource over a given period of time. The structure of the message type CapacityLoadPlanningViewByCapacityLoadPlanningViewQuery_sync is specified by the message data type CapacityLoadPlanningViewByCapacityLoadPlanningViewQueryMessage_sync.

CapacityLoadPlanningViewByCapacityLoadPlanningViewResponse is the response to a CapacityLoadPlanningViewByCapacityLoadPlanningViewQuery_sync. The structure of the message type CapacityLoadPlanningViewByCapacityLoadPlanningViewResponse__sync is specified by the message data type CapacityLoadPlanningViewByCapacityLoadPlanningViewResponseMessage_sync.

Figure 66:
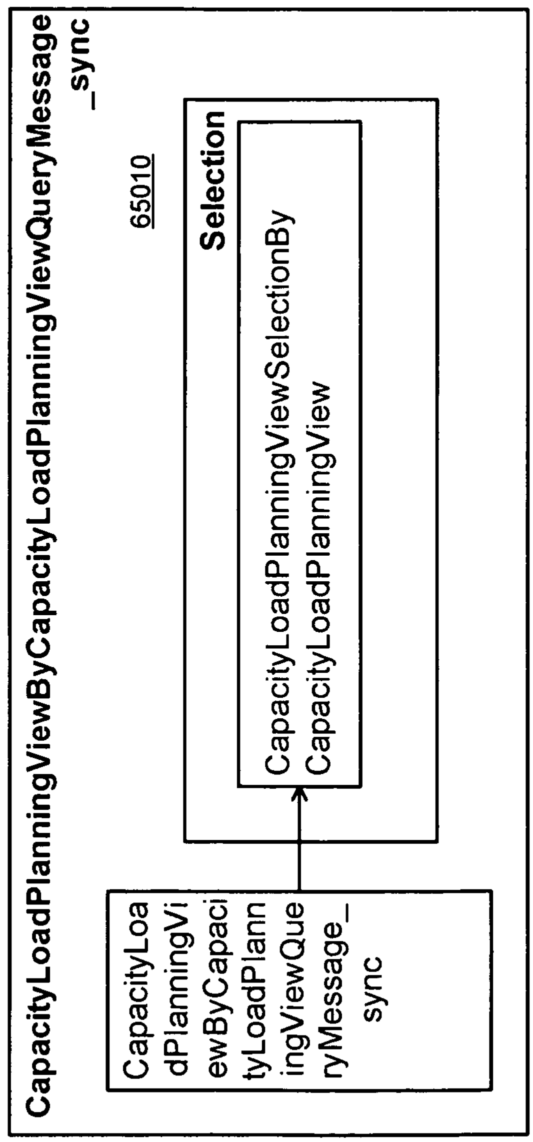
FIG. 66 shows an example CapacityLoadPlanningViewByCapacityLoadPlanningViewQueryMessage_sync Message Data Type.
Figure 67:
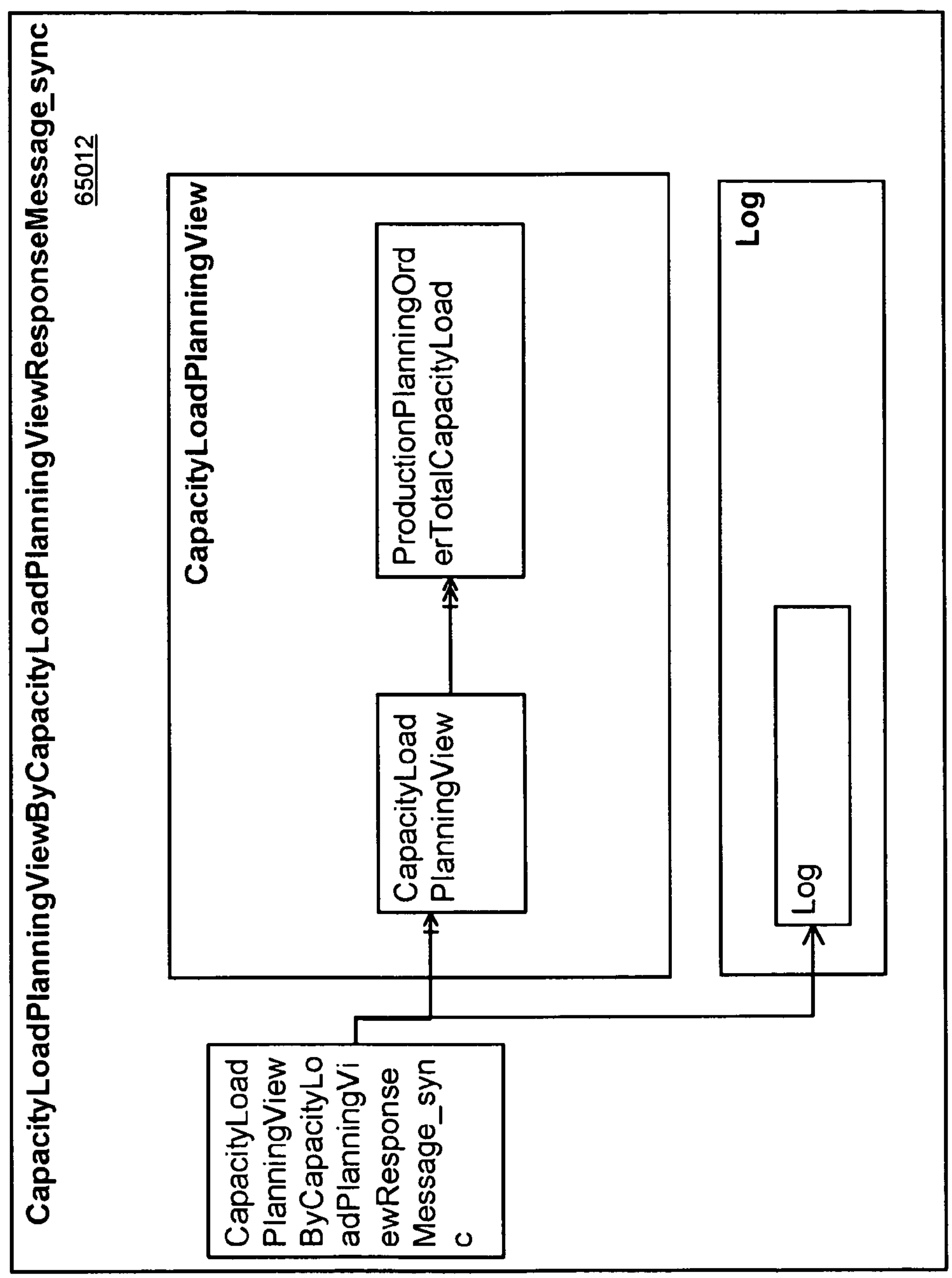
FIG. 67 shows an example CapacityLoadPlanningViewByCapacityLoadPlanningViewResponseMessage_sync Message Data Type.
Figure 68:
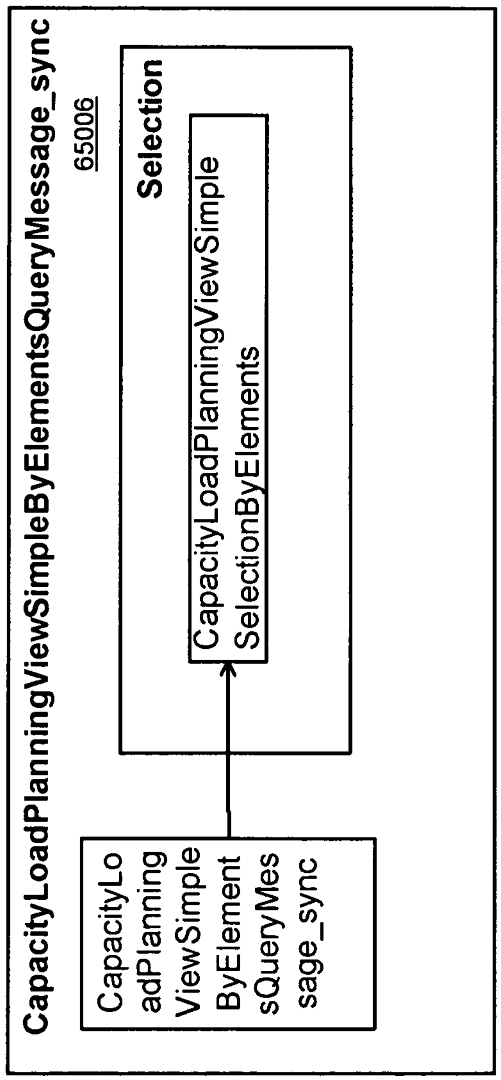
FIG. 68 shows an example CapacityLoadPlanningViewSimpleByElementsQueryMessage_sync Message Data Type.
Figure 69:
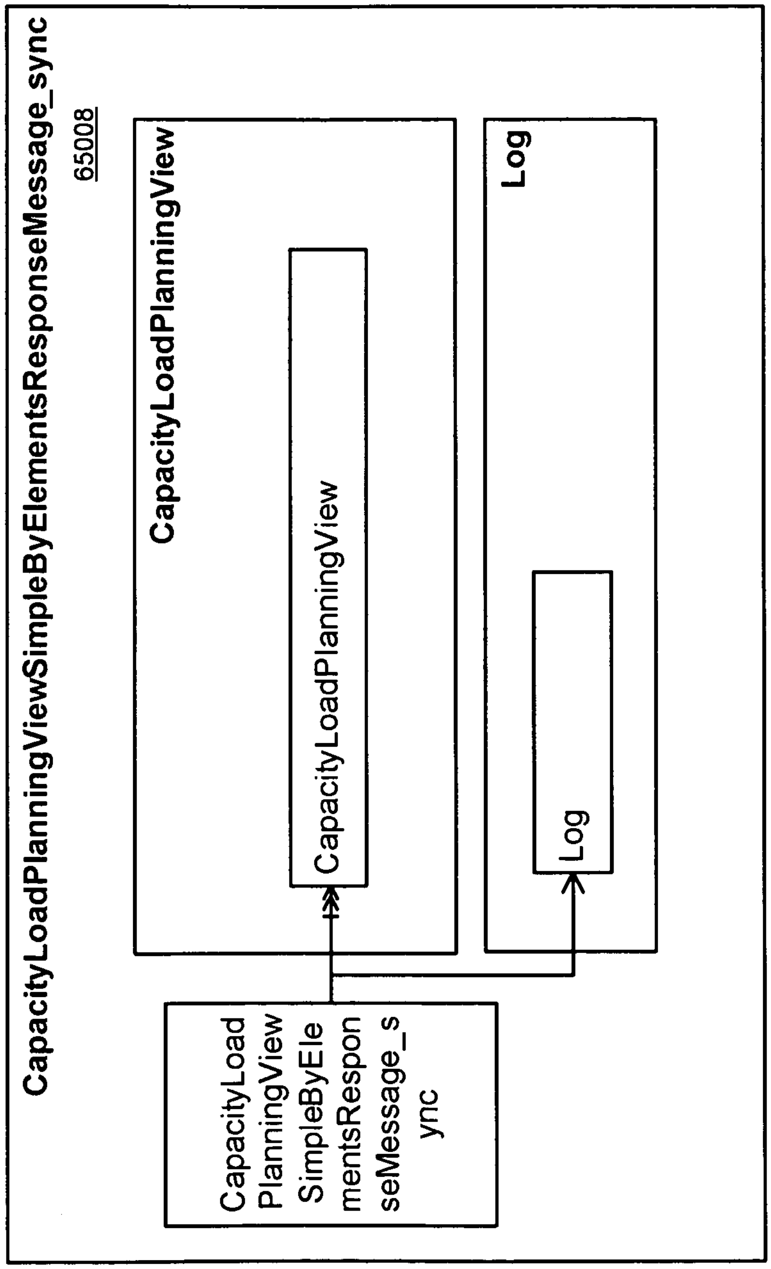
FIG. 69 shows an example CapacityLoadPlanningViewSimpleByElementsResponseMessage_sync Message Data Type.

For example, a "Supply Chain Planner" system 65002 can query capacity load planning views by elements using the CapacityLoadPlanningViewSimpleByElementsQuery_sync message 65006 as shown, for example, in FIG. 68. A "Supply and Demand Matching" system 65004 can respond to the query using the CapacityLoadPlanningViewSimpleByElementsResponse_sync message 65008 as shown, for example, in FIG. 69. The "Supply Chain Planner" system 65002 can query capacity load planning views by capacity load using the CapacityLoadPlanningViewByCapacityLoadPlanningViewQuery_sync message 65010 as shown, for example, in FIG. 66. The "Supply and Demand Matching" system 65004 can respond to the query using the CapacityLoadPlanningViewByCapacityLoadPlanningViewResponse_sync message 65012 as shown, for example, in FIG. 67.

Message Data Type

The message data type CapacityLoadPlanningViewSimpleByElementsQueryMessage_sync contains the Selection package. FIGS. 72-1 through 72-3 show a CapacityLoadPlanningViewSimpleByElementsQueryMessage_sync 72002 package. The CapacityLoadPlanningViewSimpleByElementsQueryMessage_sync 72002 package is a CapacityLoadPlanningViewSimpleByElementsQueryMessage_sync 72008 datatype. The CapacityLoadPlanningViewSimpleByElementsQueryMessage_sync 72002 package includes a CapacityLoadPlanningViewSimpleByElementsQueryMessage_sync 72004 entity. The CapacityLoadPlanningViewSimpleByElementsQueryMessage_sync 72002 package includes a CapacityLoadPlanningViewSimpleSelectionByElements 72010 package.

The CapacityLoadPlanningViewSimpleSelectionByElements 72010 package includes a CapacityLoadPlanningViewSimpleSelectionByElements 72012 entity.

The CapacityLoadPlanningViewSimpleSelectionByElements 72012 entity has a cardinality of one 72014 meaning that for each instance of the CapacityLoadPlanningViewSimpleByElementsQueryMessage_sync 72004 entity there is one CapacityLoadPlanningViewSimpleSelectionByElements 72012 entity. The CapacityLoadPlanningViewSimpleSelectionByElements 72012 entity includes various attributes, namely EvaluationPeriod 72016, PlanningVersionID 72022 and SelectionByEquipmentResourceID 72028.

The EvaluationPeriod 72016 attribute is an UPPEROPEN_LOCAL_DateTimePeriod 72020 datatype. The EvaluationPeriod 72016 attribute has a cardinality of one 72018 meaning that for each instance of the CapacityLoadPlanningViewSimpleSelectionByElements 72012 entity there is one EvaluationPeriod 72016 attribute.

The PlanningVersionID 72022 attribute is a PlanningVersionID 72026 datatype. The PlanningVersionID 72022 attribute has a cardinality of one 72024 meaning that for each instance of the CapacityLoadPlanningViewSimpleSelectionByElements 72012 entity there is one PlanningVersionID 72022 attribute.

The SelectionByEquipmentResourceID 72028 attribute is a SelectionByEquipmentResourceID 72032 datatype. The SelectionByEquipmentResourceID 72028 attribute has a cardinality of one 72030 meaning that for each instance of the CapacityLoadPlanningViewSimpleSelectionByElements 72012 entity there is one SelectionByEquipmentResourceID 72028 attribute.

Selection Package

The Selection package groups the information relevant for the query. It contains the entity CapacityLoadPlanningViewSimpleSelectionByElements.

CapacityLoadPlanningViewSimpleSelectionByElements

CapacityLoadPlanningViewSimpleSelectionByElements specifies the elements for querying instances of CapacityLoadPlanningView for a range of EquipmentResources. The CapacityLoadPlanningViewSelectionByElements contains the EvaluationPeriod, PlanningVersionID, and SelectionByEquipmentResourceID elements. The EvaluationPeriod is the period for which the capacity load on a resource is to be evaluated. PlanningVersionID is the identifier of the planning version in which the capacity load on a resource is to be evaluated. A range of EquipmentResource identifiers for which the CapacityLoadPlanningView is queried. InclusionExclusionCode is a coded representation of the inclusion of a set into a result set or the exclusion of it. IntervalBoundaryTypeCode is a coded representation of an interval boundary type. LowerBoundaryEquipmentResourceID is a unique identifier for an EquipmentResource. The LowerBoundaryEquipmentResource is the lower boundary of the EquipmentResourceID identifier interval. UpperBoundaryEquipmentResourceID is a unique identifier for an EquipmentResource. The UpperBoundaryEquipmentResource is the upper boundary of the EquipmentResourceID identifier interval.

Message Data Type

The message data type CapacityLoadPlanningViewSimpleByElementsResponseMessage_sync contains the packages CapacityLoadPlanningView and Log. FIGS. 73-1 through 73-3 show a CapacityLoadPlanningViewSimpleByElementsResponseMessage_sync 73002 package. The CapacityLoadPlanningViewSimpleByElementsResponseMessage_sync 73002 package is a CapacityLoadPlanningViewSimpleByElementsResponseMessage_sync 73008 datatype. The CapacityLoadPlanningViewSimpleByElementsResponseMessage_sync 73002 package includes a CapacityLoadPlanningViewSimpleByElementsResponseMessage_sync 73004 entity. The CapacityLoadPlanningViewSimpleByElementsResponseMessage_sync 73002 package includes various packages, namely CapacityLoadPlanningView 73010 and Log 73052.

The CapacityLoadPlanningView 73010 package includes a CapacityLoadPlanningView 73012 entity.

The CapacityLoadPlanningView 73012 entity has a cardinality of one or n 73014 meaning that for each instance of the CapacityLoadPlanningViewSimpleByElementsResponseMessage_sync 73004 entity there are one or more CapacityLoadPlanningView 73012 entities. The CapacityLoadPlanningView 73012 entity includes various attributes, namely EquipmentResourceID 73016, EvaluationPeriod 73022, PlanningVersionID 73028, TotalProductiveTimeDuration 73034, TotalOccupiedDuration 73040 and CapacityUtilizationPercent 73046.

The EquipmentResourceID 73016 attribute is a ResourceID 73020 datatype. The EquipmentResourceID 73016 attribute has a cardinality of one 73018 meaning that for each instance of the CapacityLoadPlanningView 73012 entity there is one EquipmentResourceID 73016 attribute.

The EvaluationPeriod 73022 attribute is an UPPEROPEN_LOCAL_DateTimePeriod 73026 datatype. The EvaluationPeriod 73022 attribute has a cardinality of one 73024 meaning that for each instance of the CapacityLoadPlanningView 73012 entity there is one EvaluationPeriod 73022 attribute.

The PlanningVersionID 73028 attribute is a PlanningVersionID 73032 datatype. The PlanningVersionID 73028 attribute has a cardinality of one 73030 meaning that for each instance of the CapacityLoadPlanningView 73012 entity there is one PlanningVersionID 73028 attribute.

The TotalProductiveTimeDuration 73034 attribute is a TIME_Duration 73038 datatype. The TotalProductiveTimeDuration 73034 attribute has a cardinality of one 73036 meaning that for each instance of the CapacityLoadPlanningView 73012 entity there is one TotalProductiveTimeDuration 73034 attribute.

The TotalOccupiedDuration 73040 attribute is a TIME_Duration 73044 datatype. The TotalOccupiedDuration 73040 attribute has a cardinality of one 73042 meaning that for each instance of the CapacityLoadPlanningView 73012 entity there is one TotalOccupiedDuration 73040 attribute.

The CapacityUtilizationPercent 73046 attribute is a Percent 73050 datatype. The CapacityUtilizationPercent 73046 attribute has a cardinality of one 73048 meaning that for each instance of the CapacityLoadPlanningView 73012 entity there is one CapacityUtilizationPercent 73046 attribute.

The Log 73052 package is a Log 73058 datatype. The Log 73052 package includes a Log 73054 entity.

The Log 73054 entity has a cardinality of one 73056 meaning that for each instance of the CapacityLoadPlanningViewSimpleByElementsResponseMessage_sync 73004 entity there is one Log 73054 entity.

CapacityLoadPlanningView Package

The CapacityLoadPlanningView package groups the information about the capacity load of the list of resources specified for the evaluation period. It contains the entity CapacityLoadPlanningView CapacityLoadPlanningView CapacityLoadPlanningView contains information about the capacity load of a resource summarized over the evaluation period. EquipmentResourceID is a unique identifier of the EquipmentResource. EvaluationPeriod is the period for which the capacity load on a resource is to be evaluated. PlanningVersionID is the identifier of the planning version in which the capacity load on a resource is to be evaluated. TotalProductiveTimeDuration is the total duration for which a resource is productive; aggregated over the evaluation period and specified in seconds. In case of multiactivity resources, that is, resources that can perform multiple activities at the same time, the capacity factor is more than 1. So the TotalAvailableDuration is determined by multiplying the duration for which the resource is productive with the capacity factor. TotalOccupiedDuration is the total duration for which a resource is occupied by operations/activities of ProductionPlanningOrder or is nonproductive. This is aggregated over the evaluation period and specified in seconds. In case of multiactivity resources the non-productive time is multiplied by the capacity factor. UtilizationPercent is the capacity utilization of a resource aggregated over the evaluation period and specified as a percentage. It is determined from the ratio of TotalOccupiedDuration to TotalAvailableDuration.

Log Package

A log is a sequence of messages that result when an application executes a task.

Message Data Type

The message data type CapacityLoadPlanningViewByCapacityLoadPlanningViewQueryMessage_sync contains the Selection package. FIGS. 71-1 through 71-2 show a CapacityLoadPlanningViewByCapacityLoadPlanningViewQueryMessage_sync 71002 package. The CapacityLoadPlanningViewByCapacityLoadPlanningViewQueryMessage_sync 71002 package is a CapacityLoadPlanningViewByCapacityLoadPlanningViewQueryMessage_sync 71008 datatype. The CapacityLoadPlanningViewByCapacityLoadPlanningViewQueryMessage_sync 71002 package includes a CapacityLoadPlanningViewByCapacityLoadPlanningViewQueryMessage_sync 71004 entity. The CapacityLoadPlanningViewByCapacityLoadPlanningViewQueryMessage_sync 71002 package includes a CapacityLoadPlanningViewSelectionByCapacityLoadPlanningView 71010 package.

The CapacityLoadPlanningViewSelectionByCapacityLoadPlanningView 71010 package includes a CapacityLoadPlanningViewSelectionByCapacityLoadPlanningView 71012 entity.

The CapacityLoadPlanningViewSelectionByCapacityLoadPlanningView 71012 entity has a cardinality of one 71014 meaning that for each instance of the CapacityLoadPlanningViewByCapacityLoadPlanningViewQueryMessage_sync 71004 entity there is one CapacityLoadPlanningViewSelectionByCapacityLoadPlanningView 71012 entity. The CapacityLoadPlanningViewSelectionByCapacityLoadPlanningView 71012 entity includes various attributes, namely EvaluationPeriod 71016, PlanningVersionID 71022 and EquipmentResourceID 71028.

The EvaluationPeriod 71016 attribute is an UPPEROPEN_LOCAL_DateTimePeriod 71020 datatype. The EvaluationPeriod 71016 attribute has a cardinality of one 71018 meaning that for each instance of the CapacityLoadPlanningViewSelectionByCapacityLoadPlanningView 71012 entity there is one EvaluationPeriod 71016 attribute.

The PlanningVersionID 71022 attribute is a PlanningVersionID 71026 datatype. The PlanningVersionID 71022 attribute has a cardinality of one 71024 meaning that for each instance of the CapacityLoadPlanningViewSelectionByCapacityLoadPlanningView 71012 entity there is one PlanningVersionID 71022 attribute.

The EquipmentResourceID 71028 attribute is a ResourceID 71032 datatype. The EquipmentResourceID 71028 attribute has a cardinality of one 71030 meaning that for each instance of the CapacityLoadPlanningViewSelectionByCapacityLoadPlanningView 71012 entity there is one EquipmentResourceID 71028 attribute.

Selection Package

The Selection package groups the information relevant for the query. It contains the entity CapacityLoadPlanningViewSelectionByCapacityLoadPlanningView.

CapacityLoadPlanningViewSelectionByCapacityLoadPlanningView

CapacityLoadPlanningViewSelectionByCapacityLoadPlanningView is the selection criteria comprising of the query elements to get the CapacityLoadPlanningView for an EquipmentResource. EquipmentResourceID is the unique identifier of the EquipmentResource for which the CapacityLoadPlanningView is required. EvaluationPeriod is the period for which the capacity load on a resource is to be evaluated. PlanningVersionID is the identifier of the planning version in which the capacity load on a resource is to be evaluated.

Message Data Type

The message data type CapacityLoadPlanningViewByCapacityLoadPlanningViewResponseMessage_sync contains the CapacityLoadPlanningView and Log packages. FIGS. 70-1 through 70-4 show a CapacityLoadPlanningViewByCapacityLoadPlanningViewResponseMessage_sync 70002 package. The CapacityLoadPlanningViewByCapacityLoadPlanningViewResponseMessage_sync 70002 package is a CapacityLoadPlanningViewByCapacityLoadPlanningViewResponseMessage_sync 70008 datatype. The CapacityLoadPlanningViewByCapacityLoadPlanningViewResponseMessage_sync 70002 package includes a CapacityLoadPlanningViewByCapacityLoadPlanningViewResponseMessage_sync 70004 entity. The CapacityLoadPlanningViewByCapacityLoadPlanningViewResponseMessage_sync 70002 package includes a CapacityLoadPlanningView 70010 package.

The CapacityLoadPlanningView 70010 package includes various entities, namely CapacityLoadPlanningView 70012 and Log 70086. The CapacityLoadPlanningView 70010 package includes a Log 70084 package.

The CapacityLoadPlanningView 70012 entity has a cardinality of one 70014 meaning that for each instance of the CapacityLoadPlanningViewByCapacityLoadPlanningViewResponseMessage_sync 70004 entity there is one CapacityLoadPlanningView 70012 entity. The CapacityLoadPlanningView 70012 entity includes various attributes, namely EquipmentResourceID 70016, EvaluationPeriod 70022, PlanningVersionID 70028, TotalProductiveTimeDuration 70034, TotalOccupiedDuration 70040 and CapacityUtilizationPercent 70046. The CapacityLoadPlanningView 70012 entity includes a ProductionPlanningOrderTotalCapacityLoad 70052 subordinate entity.

The EquipmentResourceID 70016 attribute is a ResourceID 70020 datatype. The EquipmentResourceID 70016 attribute has a cardinality of one 70018 meaning that for each instance of the CapacityLoadPlanningView 70012 entity there is one EquipmentResourceID 70016 attribute.

The EvaluationPeriod 70022 attribute is an UPPEROPEN_LOCAL_DateTimePeriod 70026 datatype. The EvaluationPeriod 70022 attribute has a cardinality of one 70024 meaning that for each instance of the CapacityLoadPlanningView 70012 entity there is one EvaluationPeriod 70022 attribute.

The PlanningVersionID 70028 attribute is a PlanningVersionID 70032 datatype. The PlanningVersionID 70028 attribute has a cardinality of one 70030 meaning that for each instance of the CapacityLoadPlanningView 70012 entity there is one PlanningVersionID 70028 attribute.

The TotalProductiveTimeDuration 70034 attribute is a TIME_Duration 70038 datatype. The TotalProductiveTimeDuration 70034 attribute has a cardinality of one 70036 meaning that for each instance of the CapacityLoadPlanningView 70012 entity there is one TotalProductiveTimeDuration 70034 attribute.

The TotalOccupiedDuration 70040 attribute is a TIME_Duration 70044 datatype. The TotalOccupiedDuration 70040 attribute has a cardinality of one 70042 meaning that for each instance of the CapacityLoadPlanningView 70012 entity there is one TotalOccupiedDuration 70040 attribute.

The CapacityUtilizationPercent 70046 attribute is a Percent 70050 datatype. The CapacityUtilizationPercent 70046 attribute has a cardinality of one 70048 meaning that for each instance of the CapacityLoadPlanningView 70012 entity there is one CapacityUtilizationPercent 70046 attribute.

The ProductionPlanningOrderTotalCapacityLoad 70052 entity includes various attributes, namely ProductionPlanningOrderID 70054, ProductionPlanningOrderTypeCode 70060, ProductionPlanningOrderFixedIndicator 70066, ProductionPlanningOrderStartDateTime 70072 and ProductionPlanningOrderTotalOperationDuration 70078.

The ProductionPlanningOrderID 70054 attribute is a BusinessTransactionDocumentID 70058 datatype. The ProductionPlanningOrderID 70054 attribute has a cardinality of one 70056 meaning that for each instance of the ProductionPlanningOrderTotalCapacityLoad 70052 entity there is one ProductionPlanningOrderID 70054 attribute.

The ProductionPlanningOrderTypeCode 70060 attribute is a BusinessTransactionDocumentTypeCode 70064 datatype. The ProductionPlanningOrderTypeCode 70060 attribute has a cardinality of one 70062 meaning that for each instance of the ProductionPlanningOrderTotalCapacityLoad 70052 entity there is one ProductionPlanningOrderTypeCode 70060 attribute.

The ProductionPlanningOrderFixedIndicator 70066 attribute is an Indicator 70070 datatype. The ProductionPlanningOrderFixedIndicator 70066 attribute has a cardinality of zero or one 70068 meaning that for each instance of the ProductionPlanningOrderTotalCapacityLoad 70052 entity there may be one ProductionPlanningOrderFixedIndicator 70066 attribute.

The ProductionPlanningOrderStartDateTime 70072 attribute is a LOCAL_DateTime 70076 datatype. The ProductionPlanningOrderStartDateTime 70072 attribute has a cardinality of one 70074 meaning that for each instance of the ProductionPlanningOrderTotalCapacityLoad 70052 entity there is one ProductionPlanningOrderStartDateTime 70072 attribute.

The ProductionPlanningOrderTotalOperationDuration 70078 attribute is a TIME_Duration 70082 datatype. The ProductionPlanningOrderTotalOperationDuration 70078 attribute has a cardinality of one 70080 meaning that for each instance of the ProductionPlanningOrderTotalCapacityLoad 70052 entity there is one ProductionPlanningOrderTotalOperationDuration 70078 attribute.

The Log 70086 entity has a cardinality of one 70088 meaning that for each instance of the CapacityLoadPlanningViewByCapacityLoadPlanningViewResponseMessage_sync 70004 entity there is one Log 70086 entity.

The Log 70084 package is a Log 70090 datatype. The Log 70084 package includes a Log 70086 entity.

The Log 70086 entity has a cardinality of one 70088 meaning that for each instance of the CapacityLoadPlanningViewByCapacityLoadPlanningViewResponseMessage_sync 70004 entity there is one Log 70086 entity.

CapacityLoadPlanningView Package

The CapacityLoadPlanningView package groups the information about the capacity load of the resource specified for the evaluation period. It contains the CapacityLoadPlanningView and ProductionPlanningOrderTotalCapacityLoad entities.

CapacityLoadPlanningView

ProductionPlanningOrderTotalCapacityLoad

ProductionPlanningOrderTotalCapacityLoad is the total capacity load on the resource per ProductionPlanningOrder. ProductionPlanningOrderID is the ID of the ProductionPlanningOrder whose activities are scheduled to be performed on the EquipmentResource. ProductionPlanningOrderTypeCode is a coded representation of the document type that occurs in business transactions. The document type describes the (business) nature of similar documents and defines the basic features of this type of documents. In this case it would specify the type of the ProductionPlanningOrder. ProductionPlanningOrderFixedIndicator specifies whether the production planning order is fixed or not. Fixing should be taken into account by automatic processes such as a planning run. As a rule, these processes should not change a fixed ProductionPlanningOrder. Also, fixed ProductionPlanningOrders cannot be rescheduled. ProductionPlanningOrderStartDateTime is the start time of the first operation of the ProductionPlanningOrder scheduled on the EquipmentResource. ProductionPlanningOrderTotalOperationDuration is the total duration of all the operations of the ProductionPlanningOrder scheduled to be performed on the EquipmentResource, specified in seconds.

Log Package

A log is a sequence of messages that result when an application executes a task.

Customer Quote CRM Interfaces

Business Scenario

A sales representative will create a Customer Quote as a result of a negotiation with a Customer or Prospect.

If the sales representative was not able to provide all required information for the Customer Quote creation properly during the first creation attempt, he can change the previous Customer Quote data.

In case the Customer Quote data are proper, this information is send to the Customer or Prospect who can accept or reject the Customer Quote.

Message Choreography

Figure 74:
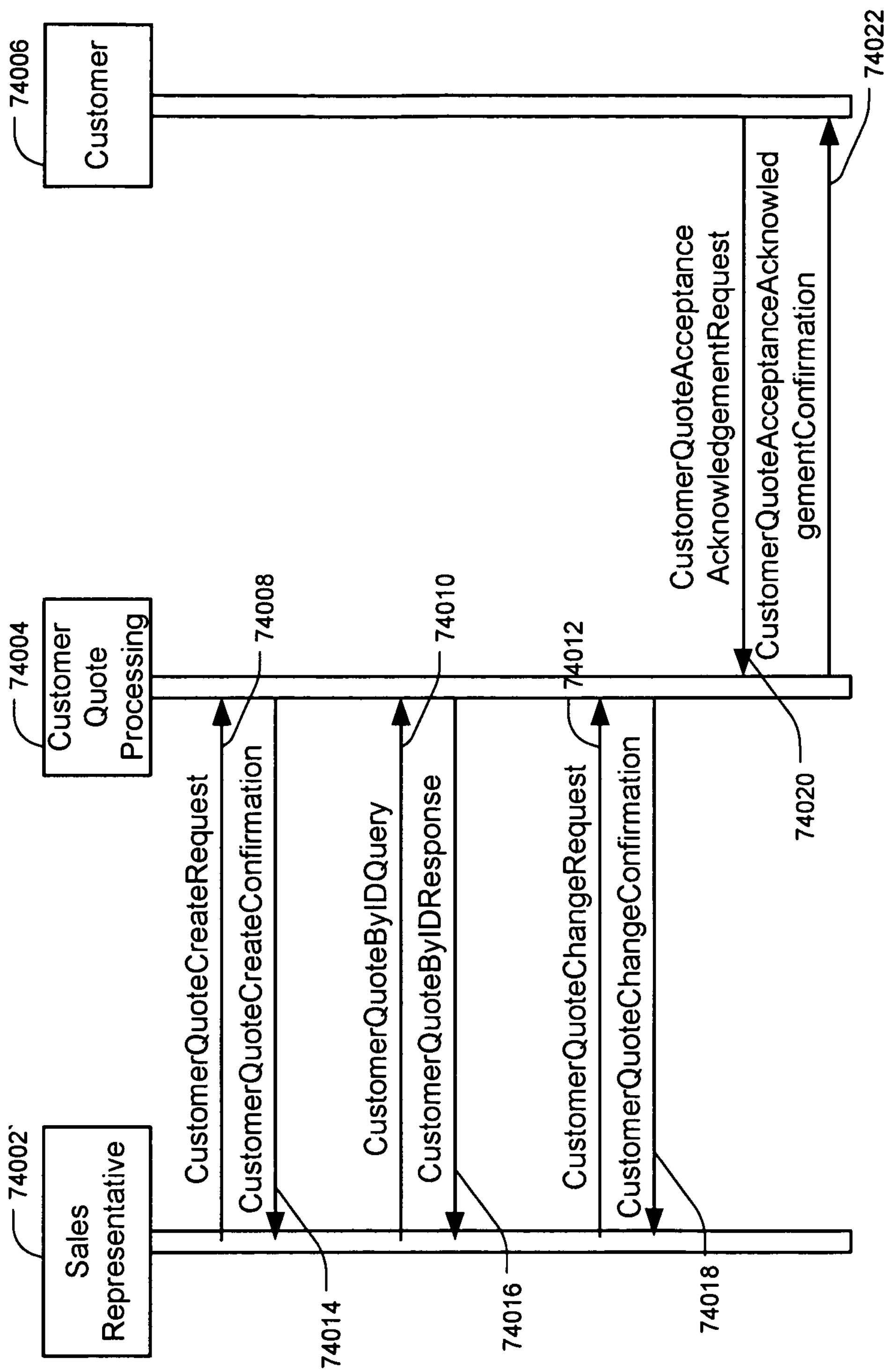
FIG. 74 shows an example CustomerQuote Message Choreography.

The message choreography of FIG. 74 describes a possible logical sequence of messages that can be used to realize a customer quote CRM business scenario.

A CustomerQuoteByIDQuery_sync is an inquiry to the Customer Quote Processing for a Customer Quote by its ID. The structure of the message type CustomerQuoteByIDQuery_sync is specified by the message data type CustomerQuoteByIDQueryMessage_sync A CustomerQuoteByIDResponse_sync is the reply to a CustomerQuoteByIDQuery_sync. It contains the details of the offer made to the customer. The structure of the message type CustomerQuoteByIDResponse_sync is specified by the message data type CustomerQuoteByIDResponseMessage_sync A CustomerQuoteCreateRequest_sync is a request to the Customer Quote Processing to create a quote using the information about the customer and the products needed. The structure of the message type CustomerQuoteCreateRequest_ sync is specified by the message data type CustomerQuoteCreateRequestMessage_sync.

A CustomerQuoteCreateConfirmation_sync is the confirmation to a CustomerQuoteCreateRequest_sync and contains the ID of the Customer Quote. The structure of the message type CustomerQuoteCreateConfirmation_sync is specified by the message data type CustomerQuoteCreateConfirmationMessage_sync.

Figure 75:
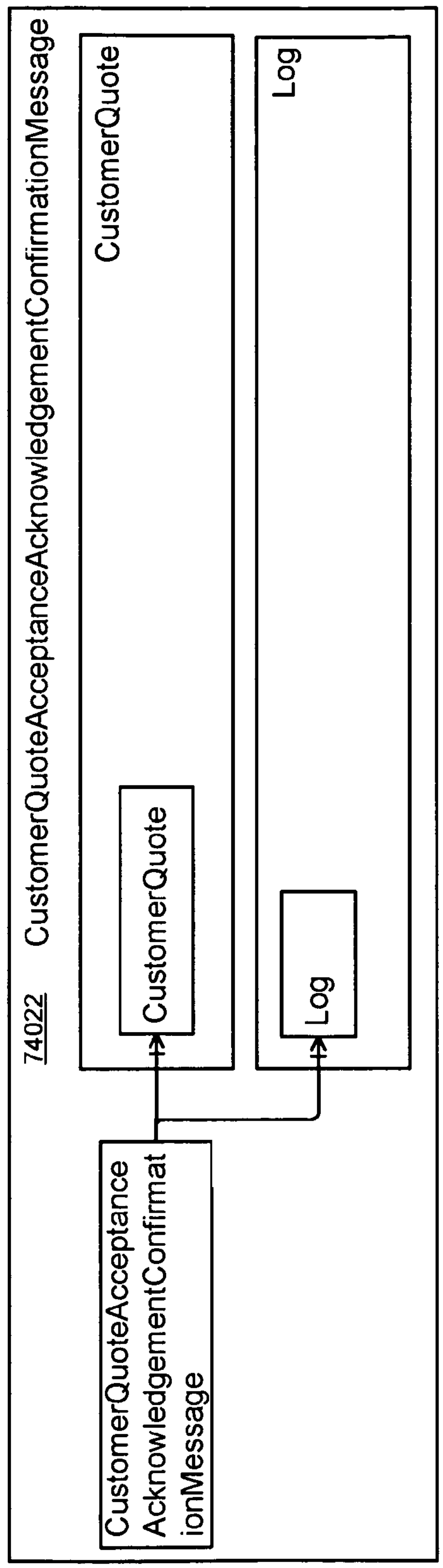
FIG. 75 shows an example CustomerQuoteAcceptanceAcknowledgementConfirmationMessage Message Data Type.
Figure 76:
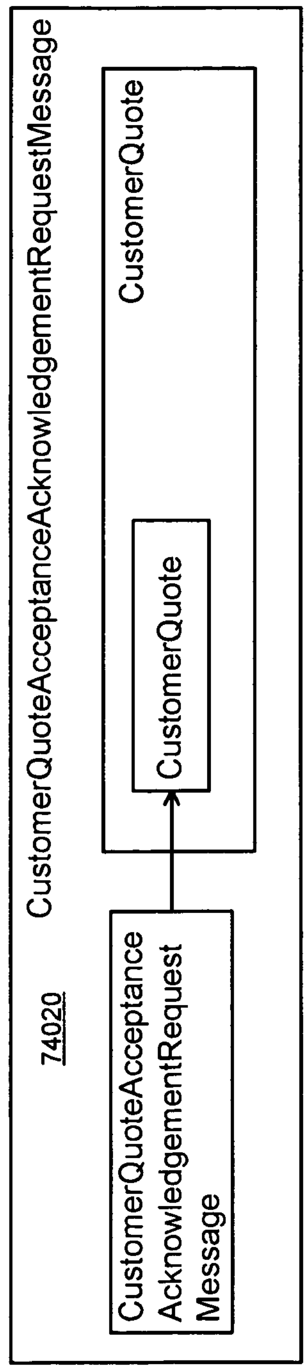
FIG. 76 shows an example CustomerQuoteAcceptanceAcknowledgementRequestMessage Message Data Type.
Figure 77:
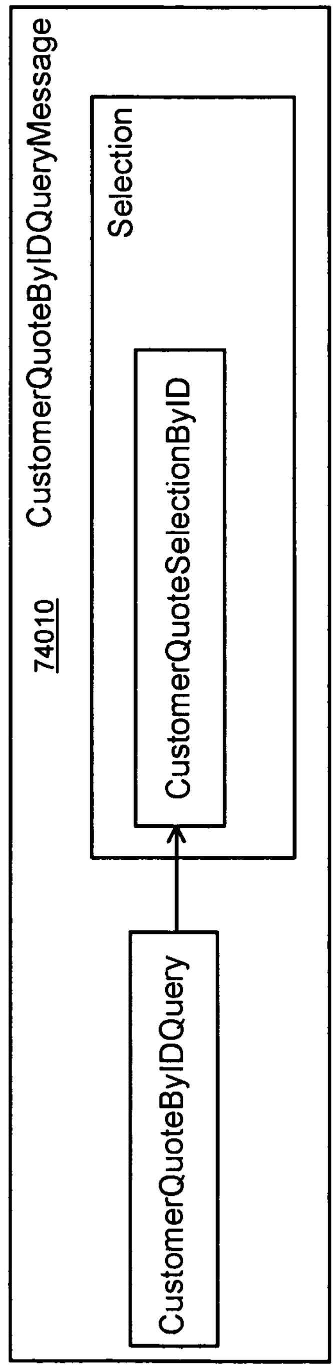
FIG. 77 shows an example CustomerQuoteByIDQueryMessage Message Data Type.
Figure 78:
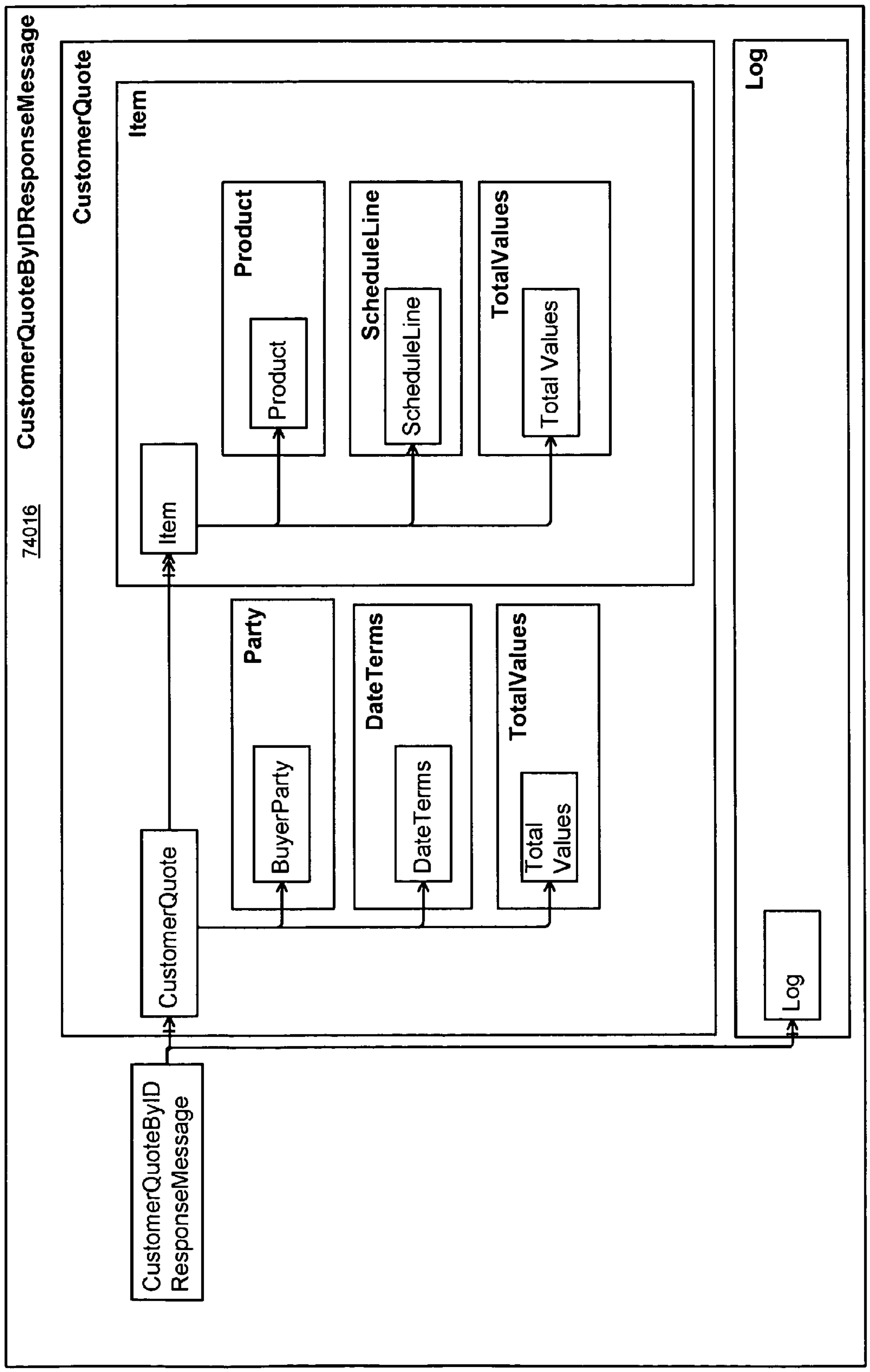
FIG. 78 shows an example CustomerQuoteByIDResponseMessage Message Data Type.
Figure 79:
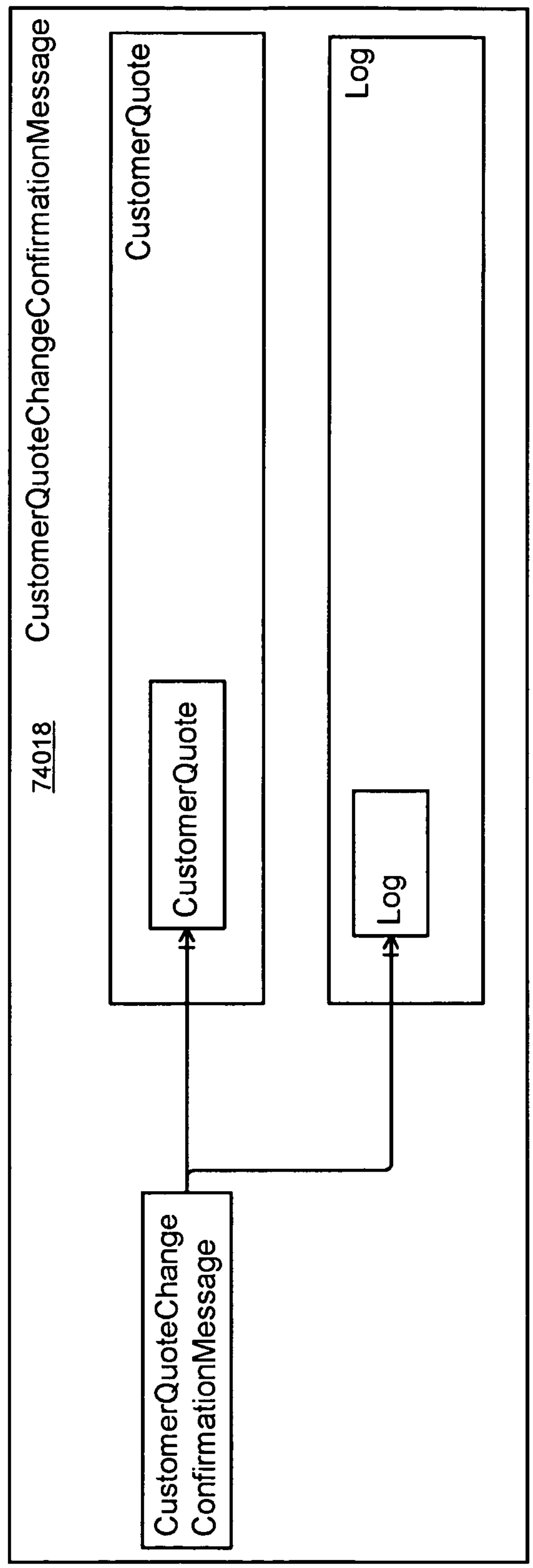
FIG. 79 shows an example CustomerQuoteChangeConfirmationMessage Message Data Type.
Figure 80:
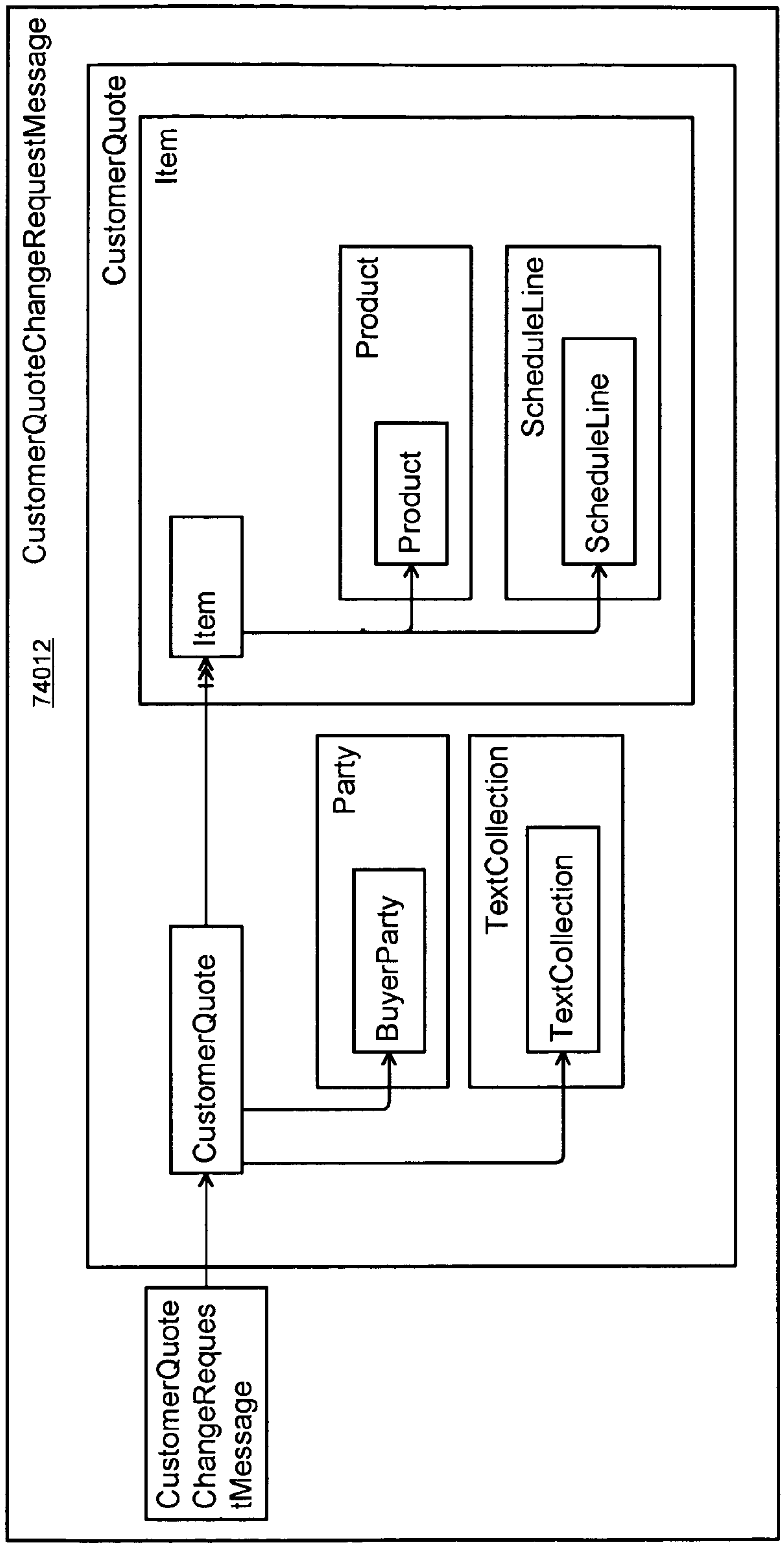
FIG. 80 shows an example CustomerQuoteChangeRequestMessage Message Data Type.
Figure 81:
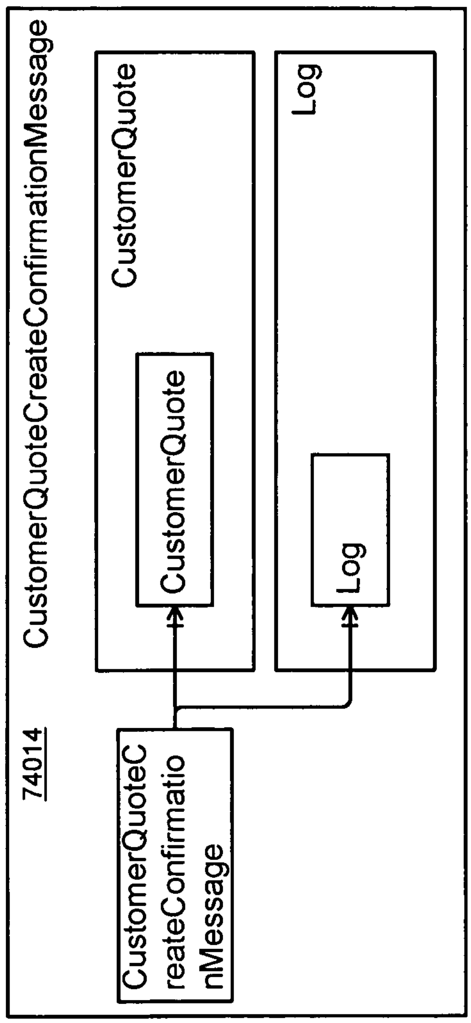
FIG. 81 shows an example CustomerQuoteCreateConfirmationMessage Message Data Type.
Figure 82:
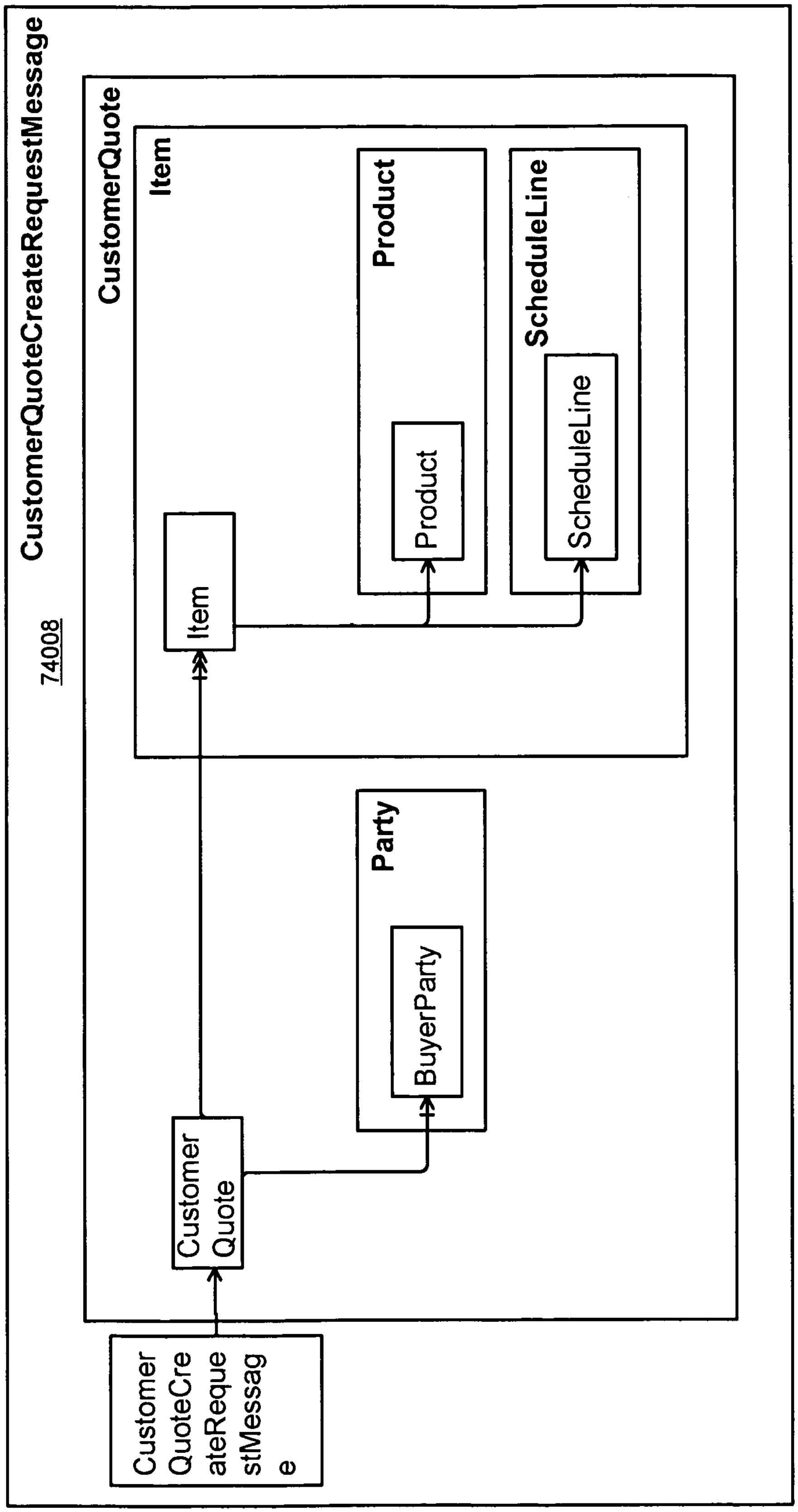
FIG. 82 shows an example CustomerQuoteCreateRequestMessage Message Data Type.

A CustomerQuoteChangeRequest_sync is a request to a Customer Quote Processing to change a CustomerQuote. The structure of the message type CustomerQuoteChangeRequest_sync is specified by the message data type CustomerQuoteChangeRequestMessage_sync A CustomerQuoteChangeConfirmation_sync is the confirmation to a CustomerQuoteChangeRequest_sync. The structure of the message type CustomerQuoteChangeConfirmation_sync is specified by the message data type CustomerQuoteChangeConfirmationMessage_sync A CustomerQuoteAcceptanceAcknowledgementRequest_sync is a request from a customer to a Customer Quote Processing to acknowledge his quote acceptance. The structure of the message type CustomerQuoteAcceptanceAcknowledgementRequest_sync is specified by the message data type CustomerQuoteAcceptanceAcknowledgementRequestMessage_sync A CustomerQuoteAcceptanceAcknowledgementConfirmation_sync is the reply to a CustomerQuoteAcceptanceAcknowledgementRequest_sync and contains the ID of the Customer Quote. This response would indicate if the customers acceptance of the CustomerQuote has been acknowledged in Customer Quote Processing. The structure of the message type CustomerQuoteAcceptanceAcknowledgementConfirmation_sync is specified by the message data type CustomerQuoteAcceptanceAcknowledgementConfirmationMessage_sync For example, a "Sales Representative" system 74002 can query customer quotes using the CustomerQuoteByIDQuery_sync message 74010 as shown, for example, in FIG. 77. A "Customer Quote Processing" system 74004 can respond to the query using the CustomerQuoteByIDResponse_sync message 74016 as shown, for example, in FIG. 78. The "Sales Representative" system 74002 can request to create a customer quote using the CustomerQuoteCreateRequest_sync message 74008 as shown, for example, in FIG. 82. The "Customer Quote Processing" system 74004 can confirm the creation request using the CustomerQuoteCreateConfirmation_sync message 74014 as shown, for example, in FIG. 81. The "Sales Representative" system 74002 can request to change a customer quote using the CustomerQuoteChangeRequest_sync message 74012 as shown, for example, in FIG. 80. The "Customer Quote Processing" system 74004 can confirm the change request using the CustomerQuoteChangeConfirmation_sync message 74018 as shown, for example, in FIG. 79. A "Customer" system 74006 can request a customer quote acceptance acknowledgement using the CustomerQuoteAcceptanceAcknowledgementRequest_sync message 74020 as shown, for example, in FIG. 76. The "Customer Quote Processing" system 74004 can confirm the request using the CustomerQuoteAcceptanceAcknowledgementConfirmation_sync message 74022 as shown, for example, in FIG. 75.

Message Data Type

The message data type CustomerQuoteByIDQueryMessage_sync contains the selection criteria included in the business document. FIG. 85 shows a CustomerQuoteByIDQueryMessage 85000 package. The CustomerQuoteByIDQueryMessage 85000 package is a CustomerQuoteByIDQueryMessage 85004 datatype. The CustomerQuoteByIDQueryMessage 85000 package includes a CustomerQuote 85002 entity. The CustomerQuoteByIDQueryMessage 85000 package includes a Selection 85006 package.

The Selection 85006 package is a CustomerQuoteSelectionByID 85012 datatype. The Selection 85006 package includes a CustomerQuoteSelectionByID 85008 entity.

The CustomerQuoteSelectionByID 85008 entity has a cardinality of one 85010 meaning that for each instance of the CustomerQuote 85002 entity there is one CustomerQuoteSelectionByID 85008 entity. The CustomerQuoteSelectionByID 85008 entity includes a CustomerQuoteID 85014 attribute.

The CustomerQuoteID 85014 attribute is a BusinessTransactionDocumentID 85018 datatype. The CustomerQuoteID 85014 attribute has a cardinality of one 85016 meaning that for each instance of the CustomerQuoteSelectionByID 85008 entity there is one CustomerQuoteID 85014 attribute.

Selection Package

The Selection Package collects the selection criteria for the CustomerQuote.

CustomerQuoteSelectionByID

The CustomerQuoteSelectionByID has the CustomerQuote Identifier to select a CustomerQuote.

CustomerQuoteByIDResponseMessage_sync

The message data type CustomerQuoteByIDResponseMessage_sync is the reply to a query for a CustomerQuote. FIGS. 86-1 through 86-4 show a CustomerQuoteByIDResponseMessage 86000 package. The CustomerQuoteByIDResponseMessage 86000 package is a CustomerQuoteByIDResponseMessage 86004 datatype. The CustomerQuoteByIDResponseMessage 86000 package includes a CustomerQuote 86002 entity. The CustomerQuoteByIDResponseMessage 86000 package includes various packages, namely CustomerQuote 86006 and Log 86116.

The CustomerQuote 86006 package includes a CustomerQuote 86008 entity. The CustomerQuote 86006 package includes various packages, namely Party 86018, DateTerms 86032, TotalValues 86050 and Item 86062.

The CustomerQuote 86008 entity has a cardinality of zero or one 86010 meaning that for each instance of the CustomerQuote 86002 entity there may be one CustomerQuote 86008 entity. The CustomerQuote 86008 entity includes an ID 86012 attribute.

The ID 86012 attribute is a BusinessTransactionDocumentID 86016 datatype. The ID 86012 attribute has a cardinality of one 86014 meaning that for each instance of the CustomerQuote 86008 entity there is one ID 86012 attribute.

The Party 86018 package is a BusinessTransactionDocumentParty 86024 datatype. The Party 86018 package includes a BuyerParty 86020 entity.

The BuyerParty 86020 entity has a cardinality of one 86022 meaning that for each instance of the CustomerQuote 86008 entity there is one BuyerParty 86020 entity. The BuyerParty 86020 entity includes a SellerID 86026 attribute.

The SellerID 86026 attribute is a PartyPartyID 86030 datatype. The SellerID 86026 attribute has a cardinality of one 86028 meaning that for each instance of the BuyerParty 86020 entity there is one SellerID 86026 attribute.

The DateTerms 86032 package includes a DateTerms 86034 entity.

The DateTerms 86034 entity has a cardinality of one 86036 meaning that for each instance of the CustomerQuote 86008 entity there is one DateTerms 86034 entity. The DateTerms 86034 entity includes various attributes, namely ValidityStartTimePointDate 86038 and ValidityEndTimePointDate 86044.

The ValidityStartTimePointDate 86038 attribute is a Date 86042 datatype. The ValidityStartTimePointDate 86038 attribute has a cardinality of one 86040 meaning that for each instance of the DateTerms 86034 entity there is one ValidityStartTimePointDate 86038 attribute.

The ValidityEndTimePointDate 86044 attribute is a Date 86048 datatype. The ValidityEndTimePointDate 86044 attribute has a cardinality of one 86046 meaning that for each instance of the DateTerms 86034 entity there is one ValidityEndTimePointDate 86044 attribute.

The TotalValues 86050 package includes a TotalValues 86052 entity.

The TotalValues 86052 entity has a cardinality of one 86054 meaning that for each instance of the CustomerQuote 86008 entity there is one TotalValues 86052 entity. The TotalValues 86052 entity includes a NetAmount 86056 attribute.

The NetAmount 86056 attribute is an Amount 86060 datatype. The NetAmount 86056 attribute has a cardinality of one 86058 meaning that for each instance of the TotalValues 86052 entity there is one NetAmount 86056 attribute.

The Item 86062 package includes an Item 86064 entity. The Item 86062 package includes various packages, namely Product 86080, ScheduleLine 86092 and TotalValues 86104.

The Item 86064 entity has a cardinality of zero or n 86066 meaning that for each instance of the CustomerQuote 86008 entity there may be one or more Item 86064 entities. The Item 86064 entity includes various attributes, namely ID 86068 and Description 86074.

The ID 86068 attribute is a BusinessTransactionDocumentItemID 86072 datatype. The ID 86068 attribute has a cardinality of one 86070 meaning that for each instance of the Item 86064 entity there is one ID 86068 attribute.

The Description 86074 attribute is a SHORT_DESCRIPTION 86078 datatype. The Description 86074 attribute has a cardinality of one 86076 meaning that for each instance of the Item 86064 entity there is one Description 86074 attribute.

The Product 86080 package includes a Product 86082 entity.

The Product 86082 entity has a cardinality of one 86084 meaning that for each instance of the Item 86064 entity there is one Product 86082 entity.

The ScheduleLine 86092 package includes a ScheduleLine 86094 entity.

The ScheduleLine 86094 entity has a cardinality of one 86096 meaning that for each instance of the Item 86064 entity there is one ScheduleLine 86094 entity.

The TotalValues 86104 package includes a TotalValues 86106 entity.

The TotalValues 86106 entity has a cardinality of one 86108 meaning that for each instance of the Item 86064 entity there is one TotalValues 86106 entity.

The Log 86116 package is a Log 86122 datatype. The Log 86116 package includes a Log 86118 entity.

The Log 86118 entity has a cardinality of zero or one 86120 meaning that for each instance of the CustomerQuote 86002 entity there may be one Log 86118 entity.

CustomerQuote Package

The CustomerQuote package groups the CustomerQuote with its packages.

CustomerQuote

A CustomerQuote is an offer from a seller to a customer regarding the delivery of goods at a certain price, for a certain quantity and at a certain time.

Party Package

A Party package groups together all the business parties involved in the CustomerQuote.

Buyer Party

A BuyerParty is a party (Customer) that purchases goods.

DateTerms Package

A CustomerQuoteDateTerms package groups the date terms of a CustomerQuote. It contains the entity DateTerms.

DateTerms

DateTerms are agreements regarding dates and durations for goods that can occur at header level in a CustomerQuote document.

TotalValues Package

A TotalValues package comprises the total values incurred in a document. It contains the entity TotalValues.

TotalValues

TotalValues are the cumulated total values of all items that occur in the CustomerQuote.

Item Package

The Item package groups the entities of the CustomerQuoteItem. The elements located at the CustomerQuoteItemItem Package are Product, ScheduleLine, and TotalValues.

Item

An Item focuses on the delivery of goods, the prices and the preparatory steps for invoicing. Item is the identifying and administrative item information in a CustomerQuote which contains all the data that applies to the item.

Product Package

A Product package contains the entities of a product in a CustomerQuoteItem.

Product

A Product is the identification, description and classification of a product in the CustomerQuoteItem.

ScheduleLine Package

A Scheduleline package holds the information scheduled for a particular item.

ScheduleLine

A ScheduleLine is an agreement regarding when products of an item are requested or provided and in what amount.

TotalValues Package

A TotalValues package holds the information of TotalValues for an item.

TotalValues

TotalValues are the total values of an item that result from dependent nodes of the item. The element located directly at the TotalValues Node is NetAmount.

Log

A Log is a sequence of messages that result when an application executes a task.

CustomerQuoteCreateRequestMessage_sync

The message data type CustomerQuoteCreateRequestMessage_sync contains the information to create a CustomerQuote as a business document and the business information that is relevant for sending a business document in a message. FIGS. 90-1 through 90-3 show a CustomerQuoteCreateRequestMessage 90000 package. The CustomerQuoteCreateRequestMessage 90000 package is a CustomerQuoteCreateRequestMessage 90004 datatype. The CustomerQuoteCreateRequestMessage 90000 package includes a CustomerQuoteCreateRequestMessage 90002 entity. The CustomerQuoteCreateRequestMessage 90000 package includes various packages, namely CustomerQuote 90006 and Log 90070.

The CustomerQuote 90006 package includes a CustomerQuote 90008 entity. The CustomerQuote 90006 package includes various packages, namely Party 90018 and Item 90032.

The CustomerQuote 90008 entity has a cardinality of one 90010 meaning that for each instance of the CustomerQuoteCreateRequestMessage 90002 entity there is one CustomerQuote 90008 entity. The CustomerQuote 90008 entity includes a ProcessingTypeCode 90012 attribute.

The ProcessingTypeCode 90012 attribute is a BusinessTransactionDocumentProcessingTypeCode 90016 datatype. The ProcessingTypeCode 90012 attribute has a cardinality of one 90014 meaning that for each instance of the CustomerQuote 90008 entity there is one ProcessingTypeCode 90012 attribute.

The Party 90018 package is a BusinessTransactionDocumentParty 90024 datatype. The Party 90018 package includes a BuyerParty 90020 entity.

The BuyerParty 90020 entity has a cardinality of zero or one 90022 meaning that for each instance of the CustomerQuote 90008 entity there may be one BuyerParty 90020 entity. The BuyerParty 90020 entity includes a SellerID 90026 attribute.

The SellerID 90026 attribute is a PartyPartyID 90030 datatype. The SellerID 90026 attribute has a cardinality of one 90028 meaning that for each instance of the BuyerParty 90020 entity there is one SellerID 90026 attribute.

The Item 90032 package includes an Item 90034 entity. The Item 90032 package includes various packages, namely Product 90044 and ScheduleLine 90058.

The Item 90034 entity has a cardinality of zero or n 90036 meaning that for each instance of the CustomerQuote 90008 entity there may be one or more Item 90034 entities. The Item 90034 entity includes an ID 90038 attribute.

The ID 90038 attribute is a BusinessTransactionDocumentItemID 90042 datatype. The ID 90038 attribute has a cardinality of one 90040 meaning that for each instance of the Item 90034 entity there is one ID 90038 attribute.

The Product 90044 package is a BusinessTransactionDocumentProduct 90050 datatype. The Product 90044 package includes a Product 90046 entity.

The Product 90046 entity has a cardinality of one 90048 meaning that for each instance of the Item 90034 entity there is one Product 90046 entity. The Product 90046 entity includes a SellerID 90052 attribute.

The SellerID 90052 attribute is a ProductPartyID 90056 datatype. The SellerID 90052 attribute has a cardinality of one 90054 meaning that for each instance of the Product 90046 entity there is one SellerID 90052 attribute.

The ScheduleLine 90058 package includes a ScheduleLine 90060 entity.

The ScheduleLine 90060 entity has a cardinality of one 90062 meaning that for each instance of the Item 90034 entity there is one ScheduleLine 90060 entity. The ScheduleLine 90060 entity includes a RequestedQuantity 90064 attribute.

The RequestedQuantity 90064 attribute is a Quantity 90068 datatype. The RequestedQuantity 90064 attribute has a cardinality of one 90066 meaning that for each instance of the ScheduleLine 90060 entity there is one RequestedQuantity 90064 attribute.

The Log 90070 package is a Log 90076 datatype. The Log 90070 package includes a Log 90072 entity.

The Log 90072 entity has a cardinality of zero or one 90074 meaning that for each instance of the CustomerQuoteCreateRequestMessage 90002 entity there may be one Log 90072 entity.

CustomerQuote Package

The CustomerQuote package groups the CustomerQuote with its packages.

CustomerQuote

The element located at the Customer Quote entity is ProcessingTypeCode. A ProcessingTypeCode is the coded representation of the way in which a CustomerQuote is processed.

Party Package

A Party package groups together all the business parties involved in the CustomerQuote. It contains the entity BuyerParty.

Buyer Party

Item Package

The Item package groups the entities of the CustomerQuoteItem. The elements located at the CustomerQuoteItemItem Package are Product and ScheduleLine.

CustomerQuoteItem

Product Package

A Product package contains the entities of a product in a CustomerQuoteItem.

Product

ScheduleLine Package

A Scheduleline package holds the information scheduled for a particular item.

Message Data Type

The message data type CustomerQuoteCreateConfirmationMessage_sync contains the necessary information in regard to creation of CustomerQuote as a business document and the business information that is relevant for sending a business document in a message. FIG. 89 shows a CustomerQuoteCreateConfirmationMessage 89000 package. The CustomerQuoteCreateConfirmationMessage 89000 package is a CustomerQuoteCreateConfirmationMessage 89004 datatype. The CustomerQuoteCreateConfirmationMessage 89000 package includes a CustomerQuoteCreateConfirmationMessage 89002 entity. The CustomerQuoteCreateConfirmationMessage 89000 package includes various packages, namely CustomerQuote 89006 and Log 89024.

The CustomerQuote 89006 package includes a CustomerQuote 89008 entity.

The CustomerQuote 89008 entity has a cardinality of zero or one 89010 meaning that for each instance of the CustomerQuoteCreateConfirmationMessage 89002 entity there may be one CustomerQuote 89008 entity. The CustomerQuote 89008 entity includes various attributes, namely ID 89012 and AcceptanceStatusCode 89018.

The ID 89012 attribute is a BusinessTransactionDocumentID 89016 datatype. The ID 89012 attribute has a cardinality of one 89014 meaning that for each instance of the CustomerQuote 89008 entity there is one ID 89012 attribute.

The AcceptanceStatusCode 89018 attribute is an AcceptanceStatusCode 89022 datatype. The AcceptanceStatusCode 89018 attribute has a cardinality of one 89020 meaning that for each instance of the CustomerQuote 89008 entity there is one AcceptanceStatusCode 89018 attribute.

The Log 89024 package is a Log 89030 datatype. The Log 89024 package includes a Log 89026 entity.

The Log 89026 entity has a cardinality of zero or one 89028 meaning that for each instance of the CustomerQuoteCreateConfirmationMessage 89002 entity there may be one Log 89026 entity.

CustomerQuote Package

The CustomerQuote package contains the CustomerQuote identification.

CustomerQuote

Log

A Log is a sequence of messages that result when an application executes a task.

Message Data Type

The message data type CustomerQuoteChangeRequestMessage_sync contains the changed CustomerQuote. It contains the package CustomerQuote. FIGS. 88-1 through 88-4 show a CustomerQuoteChangeRequestMessage 88000 package. The CustomerQuoteChangeRequestMessage 88000 package is a CustomerQuoteChangeRequestMessage 88004 datatype. The CustomerQuoteChangeRequestMessage 88000 package includes a CustomerQuoteChangeRequestMessage 88002 entity. The CustomerQuoteChangeRequestMessage 88000 package includes various packages, namely CustomerQuote 88006 and Log 88110.

The CustomerQuote 88006 package includes a CustomerQuote 88008 entity. The CustomerQuote 88006 package includes various packages, namely Party 88018, TextCollection 88030 and Item 88074.

The CustomerQuote 88008 entity has a cardinality of one 88010 meaning that for each instance of the CustomerQuoteChangeRequestMessage 88002 entity there is one CustomerQuote 88008 entity. The CustomerQuote 88008 entity includes an ID 88012 attribute.

The ID 88012 attribute is a BusinessTransactionDocumentID 88016 datatype. The ID 88012 attribute has a cardinality of one 88014 meaning that for each instance of the CustomerQuote 88008 entity there is one ID 88012 attribute.

The Party 88018 package includes a BuyerParty 88020 entity.

The BuyerParty 88020 entity has a cardinality of one 88022 meaning that for each instance of the CustomerQuote 88008 entity there is one BuyerParty 88020 entity. The BuyerParty 88020 entity includes a SellerID 88024 attribute.

The SellerID 88024 attribute is a PartyPartyID 88028 datatype. The SellerID 88024 attribute has a cardinality of one 88026 meaning that for each instance of the BuyerParty 88020 entity there is one SellerID 88024 attribute.

The TextCollection 88030 package is a TextCollection 88036 datatype. The TextCollection 88030 package includes a TextCollection 88032 entity.

The TextCollection 88032 entity has a cardinality of zero or one 88034 meaning that for each instance of the CustomerQuote 88008 entity there may be one TextCollection 88032 entity. The TextCollection 88032 entity includes various attributes, namely ActionCode 88038 and Text 88044.

The ActionCode 88038 attribute is an ActionCode 88042 datatype. The ActionCode 88038 attribute has a cardinality of zero or one 88040 meaning that for each instance of the TextCollection 88032 entity there may be one ActionCode 88038 attribute.

The Text 88044 attribute is a TextCollectionText 88048 datatype. The Text 88044 attribute has a cardinality of zero or n 88046 meaning that for each instance of the TextCollection 88032 entity there may be one or more Text 88044 attributes.

The Item 88074 package includes an Item 88076 entity. The Item 88074 package includes various packages, namely Product 88086 and ScheduleLine 88098.

The Item 88076 entity has a cardinality of zero or n 88078 meaning that for each instance of the CustomerQuote 88008 entity there may be one or more Item 88076 entities. The Item 88076 entity includes an ID 88080 attribute.

The ID 88080 attribute is a BusinessTransactionDocumentItemID 88084 datatype. The ID 88080 attribute has a cardinality of one 88082 meaning that for each instance of the Item 88076 entity there is one ID 88080 attribute.

The Product 88086 package includes a Product 88088 entity.

The Product 88088 entity has a cardinality of one 88090 meaning that for each instance of the Item 88076 entity there is one Product 88088 entity. The Product 88088 entity includes a SellerID 88092 attribute.

The SellerID 88092 attribute is a ProductPartyID 88096 datatype. The SellerID 88092 attribute has a cardinality of one 88094 meaning that for each instance of the Product 88088 entity there is one SellerID 88092 attribute.

The ScheduleLine 88098 package includes a ScheduleLine 88100 entity.

The ScheduleLine 88100 entity has a cardinality of one 88102 meaning that for each instance of the Item 88076 entity there is one ScheduleLine 88100 entity. The ScheduleLine 88100 entity includes a RequestedQuantity 88104 attribute.

The RequestedQuantity 88104 attribute is a Quantity 88108 datatype. The RequestedQuantity 88104 attribute has a cardinality of one 88106 meaning that for each instance of the ScheduleLine 88100 entity there is one RequestedQuantity 88104 attribute.

The Log 88110 package is a Log 88116 datatype. The Log 88110 package includes a Log 88112 entity.

The Log 88112 entity has a cardinality of zero or one 88114 meaning that for each instance of the CustomerQuoteChangeRequestMessage 88002 entity there may be one Log 88112 entity.

CustomerQuote Package

The CustomerQuote package groups the CustomerQuote with its packages. It contains the package PartyPackage, TextCollection, and Item.

CustomerQuote

A CustomerQuote is an offer from a seller to a customer regarding the delivery of goods at a certain price, for a certain quantity and at a certain time.

Party Package

A Party package groups together all the business parties involved in the CustomerQuote. It contains the entity BuyerParty.

Buyer Party

TextCollection

A TextCollection package holds the information of a TextCollection.

TextCollection

TextCollection is a natural-language text that refers to the ServiceOrder document.

Item Package

The Item package groups the entities of the CustomerQuoteItem. The entities located at the Item Package are Product and ScheduleLine.

CustomerQuoteItem

Product Package

A Product package contains the entities of a product in a CustomerQuoteItem. It contains the following entity Product.

Product

ScheduleLine Package

A Scheduleline package holds the information scheduled for a particular item. It contains the entity ScheduleLine.

ScheduleLine

Message Data Type

The message data type CustomerQuoteChangeConfirmationMessage_sync contains the necessary information in regard to change of CustomerQuote as a business document and the business information that is relevant for sending a business document in a message. FIG. 87 shows a CustomerQuoteChangeConfirmationMessage 87000 package. The CustomerQuoteChangeConfirmationMessage 87000 package is a CustomerQuoteChangeConfirmationMessage 87004 datatype. The CustomerQuoteChangeConfirmationMessage 87000 package includes a CustomerQuoteChangeConfirmationMessage 87002 entity. The CustomerQuoteChangeConfirmationMessage 87000 package includes various packages, namely CustomerQuote 87006 and Log 87024.

The CustomerQuote 87006 package includes a CustomerQuote 87008 entity.

The CustomerQuote 87008 entity has a cardinality of zero or one 87010 meaning that for each instance of the CustomerQuoteChangeConfirmationMessage 87002 entity there may be one CustomerQuote 87008 entity. The CustomerQuote 87008 entity includes various attributes, namely ID 87012 and AcceptanceStatusCode 87018.

The ID 87012 attribute is a BusinessTransactionDocumentID 87016 datatype. The ID 87012 attribute has a cardinality of one 87014 meaning that for each instance of the CustomerQuote 87008 entity there is one ID 87012 attribute.

The AcceptanceStatusCode 87018 attribute is an AcceptanceStatusCode 87022 datatype. The AcceptanceStatusCode 87018 attribute has a cardinality of one 87020 meaning that for each instance of the CustomerQuote 87008 entity there is one AcceptanceStatusCode 87018 attribute.

The Log 87024 package is a Log 87030 datatype. The Log 87024 package includes a Log 87026 entity.

The Log 87026 entity has a cardinality of zero or one 87028 meaning that for each instance of the CustomerQuoteChangeConfirmationMessage 87002 entity there may be one Log 87026 entity.

CustomerQuote Package

The CustomerQuote package contains the CustomerQuote identification. It contains the entity CustomerQuote.

CustomerQuote

Log

A Log is a sequence of messages that result when an application executes a task.

CustomerQuoteAcceptanceAcknowledgementRequestMessage_sync

A CustomerQuoteAcceptanceAcknowledgementRequestMessage_sync is a request to acknowledge the customers acceptance of a CustomerQuote. FIG. 84 shows a CustomerQuoteAcceptanceAcknowledgementRequestMessage 84000 package. The CustomerQuoteAcceptanceAcknowledgementRequestMessage 84000 package is a CustomerQuoteAcceptanceAcknowledgementRequestMessage 84004 datatype. The CustomerQuoteAcceptanceAcknowledgementRequestMessage 84000 package includes a CustomerQuoteAcceptRequestMessage 84002 entity. The CustomerQuoteAcceptanceAcknowledgementRequestMessage 84000 package includes a CustomerQuote 84006 package.

The CustomerQuote 84006 package includes a CustomerQuote 84008 entity.

The CustomerQuote 84008 entity has a cardinality of one 84010 meaning that for each instance of the CustomerQuoteAcceptRequestMessage 84002 entity there is one CustomerQuote 84008 entity. The CustomerQuote 84008 entity includes an ID 84012 attribute.

The ID 84012 attribute is a BusinessTransactionDocumentID 84016 datatype. The ID 84012 attribute has a cardinality of one 84014 meaning that for each instance of the CustomerQuote 84008 entity there is one ID 84012 attribute.

CustomerQuote Package

The CustomerQuote package contains the CustomerQuote identification. It contains the entity nCustomerQuote.

CustomerQuote

CustomerQuoteAcceptanceAcknowledgementConfirmationMessage_sync

The message data type CustomerQuoteAcceptanceAcknowledgementConfirmationMessage_sync contains the necessary information in regard to creation of CustomerQuote as a business document and the business information that is relevant for sending a business document in a message. FIG. 83 shows a CustomerQuoteAcceptanceAcknowledgementConfirmationMessage 83000 package. The CustomerQuoteAcceptanceAcknowledgementConfirmationMessage 83000 package is a CustomerQuoteAcceptanceAcknowledgementConfirmationMessage 83004 datatype. The CustomerQuoteAcceptanceAcknowledgementConfirmationMessage 83000 package includes a CustomerQuoteAcceptConfirmationMessage 83002 entity. The CustomerQuoteAcceptanceAcknowledgementConfirmationMessage 83000 package includes various packages, namely CustomerQuote 83006 and Log 83024.

The CustomerQuote 83006 package includes a CustomerQuote 83008 entity.

The CustomerQuote 83008 entity has a cardinality of zero or one 83010 meaning that for each instance of the CustomerQuoteAcceptConfirmationMessage 83002 entity there may be one CustomerQuote 83008 entity. The CustomerQuote 83008 entity includes various attributes, namely ID 83012 and AcceptanceStatusCode 83018.

The ID 83012 attribute is a BusinessTransactionDocumentID 83016 datatype. The ID 83012 attribute has a cardinality of one 83014 meaning that for each instance of the CustomerQuote 83008 entity there is one ID 83012 attribute.

The AcceptanceStatusCode 83018 attribute is an AcceptanceStatusCode 83022 datatype. The AcceptanceStatusCode 83018 attribute has a cardinality of one 83020 meaning that for each instance of the CustomerQuote 83008 entity there is one AcceptanceStatusCode 83018 attribute.

The Log 83024 package is a Log 83030 datatype. The Log 83024 package includes a Log 83026 entity.

The Log 83026 entity has a cardinality of zero or one 83028 meaning that for each instance of the CustomerQuoteAcceptConfirmationMessage 83002 entity there may be one Log 83026 entity.

CustomerQuote Package

The CustomerQuote package contains the CustomerQuote identification. It contains the entity CustomerQuote.

CustomerQuote

Log

A Log is a sequence of messages that result when an application executes a task.

CustomerQuote ERP Interfaces

The CustomerQuote Interfaces provides the service operations required in an A2X process for the communication between a Seller and the Customer Quote Processing.

For example the CustomerQuote Interfaces facilitates service operations to manage a User Status driven approval process of CustomerQuotes.

Message Choreography

Figure 91:
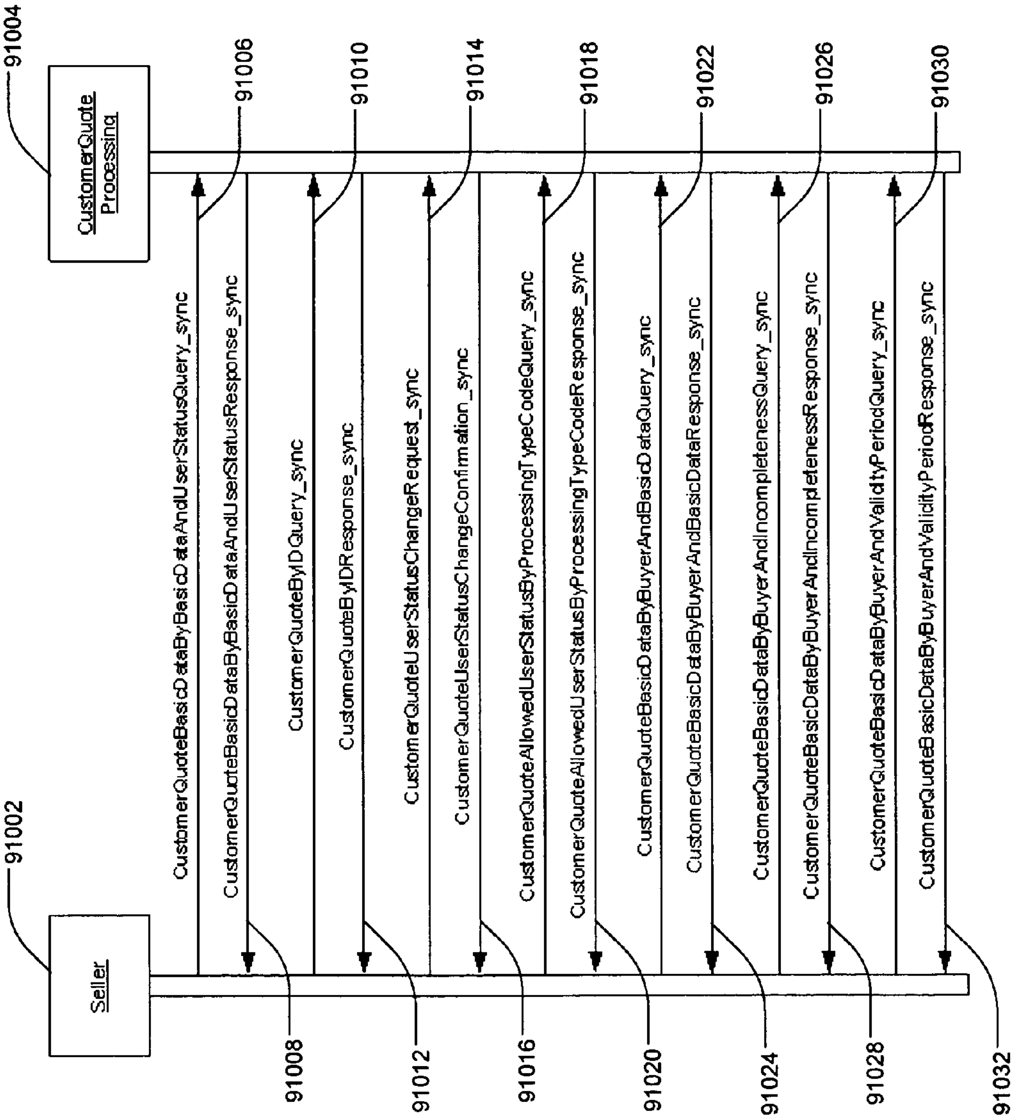
FIG. 91 shows an example CustomerQuote Message Choreography.

The message choreography of FIG. 91 describes a possible logical sequence of messages that can be used to realize a customer quote ERP business scenario. A CustomerQuoteBasicDataByBasicDataAndUserStatusQuery_sync is an inquiry to the Customer Quote Processing to return CustomerQuotes fulfilling the selection CustomerQuoteBasicDataSelectionByBasicDataAndUserStatus. The structure of the message type CustomerQuoteBasicDataByBasicDataAndUserStatusQuery_sync is specified by the message data type CustomerQuoteBasicDataByBasicDataAndUserStatusQueryMessage_sync.

A CustomerQuoteBasicDataByBasicDataAndUserStatusResponse_sync is the response to an inquiry CustomerQuoteBasicDataByBasicDataAndUserStatusQuery_sync and contains basic data of CustomerQuote. The structure of the message type CustomerQuoteBasicDataByBasicDataAndUserStatusResponse_sync is specified by the message data type CustomerQuoteBasicDataByBasicDataAndUserStatusResponseMessage_sync which is derived from the message data type CustomerQuoteMessage.

A CustomerQuoteByIDQuery_sync is an inquiry to the Customer Quote Processing to return a CustomerQuote by the selection criteria CustomerQuoteSelectionByID. The structure of the message type CustomerQuoteByIDQuery_sync is specified by the message data type CustomerQuoteByIDQueryMessage_sync.

A CustomerQuoteByIDResponse_sync is the response to an inquiry CustomerQuoteByIDQuery_sync and contains a CustomerQuote. The structure of the message type CustomerQuoteByIDResponse_sync is specified by the message data type CustomerQuoteByIDResponseMessage_sync which is derived from the message data type CustomerQuoteMessage.

A CustomerQuoteUserStatusChangeRequest_sync is a request made to the Customer Quote Processing to change the User Status of an existing CustomerQuote. The structure of the message type CustomerQuoteUserStatusChangeRequest_sync is specified by the message data type CustomerQuoteUserStatusChangeRequestMessage_sync which is derived from the message data type CustomerQuoteMessage.

A CustomerQuoteUserStatusChangeConfirmation_sync is a confirmation to the CustomerQuoteUserStatusChangeRequest_sync and contains the CustomerQuoteUserStatus view. The structure of the message type CustomerQuoteUserStatusChangeConfirmation_sync is specified by the message data type CustomerQuoteUserStatusChangeConfirmationMessage_sync which is derived from the message data type CustomerQuoteMessage.

A CustomerQuoteAllowedUserStatusByProcessingTypeCodeQuery_sync is an inquiry to the Customer Quote Processing to return CustomerQuoteAllowedUserStatus fulfilling the selection CustomerQuoteAllowedUserStatusSelectionByProcessingTypeCode. The structure of the message type CustomerQuoteAllowedUserStatusByProcessingTypeCodeQuery_sync is specified by the message data type CustomerQuoteAllowedUserStatusByProcessingTypeCodeQueryMessage_sync.

A CustomerQuoteAllowedUserStatusByProcessingTypeCodeResponse_sync is the response to an inquiry CustomerQuoteAllowedUserStatusByProcessingTypeCodeQuery_sync and contains the data of CustomerQuoteAllowedUserStatus. The structure of the message type CustomerQuoteAllowedUserStatusByProcessingTypeCodeResponse_sync is specified by the message data type CustomerQuoteAllowedUserStatusByProcessingTypeCodeResponseMessage_sync which is derived from the message data type CustomerQuoteMessage.

A CustomerQuoteBasicDataByBuyerAndBasicDataQuery_sync is an inquiry to the Customer Quote Processing for CustomerQuoteBasicData fulfilling the selection CustomerQuoteBasicDataSelectionByBuyerAndBasicData. The structure of the message type CustomerQuoteBasicDataByBuyerAndBasicDataQuery_sync is specified by the message data type CustomerQuoteBasicDataByBuyerAndBasicDataQueryMessage_sync.

A CustomerQuoteBasicDataByBuyerAndBasicDataResponse_sync is the response to an inquiry CustomerQuoteBasicDataByBuyerAndBasicDataQuery_sync and contains basic data of CustomerQuote. The structure of the message type CustomerQuoteBasicDataByBuyerAndBasicDataResponse_sync is specified by the message data type CustomerQuoteBasicDataByBuyerAndBasicDataResponseMessage_sync which is derived from the message data type CustomerQuoteMessage.

A CustomerQuoteBasicDataByBuyerAndIncompletenessQuery_sync is an inquiry to the Customer Quote Processing for CustomerQuoteBasicData fulfilling the selection CustomerQuoteBasicDataSelectionByBuyerAndIncompleteness. The structure of the message type CustomerQuoteBasicDataByBuyerAndIncompletenessQuery_sync is specified by the message data type CustomerQuoteBasicDataByBuyerAndIncompletenessQueryMessage_sync.

A CustomerQuoteBasicDataByBuyerAndIncompletenessResponse_sync is the response to an inquiry CustomerQuoteBasicDataByBuyerAndIncompletenessQuery_sync and contains basic data of CustomerQuote. The structure of the message type CustomerQuoteBasicDataByBuyerAndIncompletenessResponse_sync is specified by the message data type CustomerQuoteBasicDataByBuyerAndIncompletenessResponseMessage_sync which is derived from the message data type CustomerQuoteMessage.

A CustomerQuoteBasicDataByBuyerAndValidityPeriodQuery_sync is an inquiry to the Customer Quote Processing for CustomerQuoteBasicData fulfilling the selection CustomerQuoteBasicDataSelectionByBuyerAndValidityPeriodQuery. The structure of the message type CustomerQuoteBasicDataByBuyerAndValidityPeriodQuery_sync is specified by the message data type CustomerQuoteBasicDataByBuyerAndValidityPeriodQueryMessage_sync.

A CustomerQuoteBasicDataByBuyerAndValidityPeriodResponse_sync is the response to an inquiry CustomerQuoteBasicDataByBuyerAndValidityPeriodQuery_sync and contains basic data of CustomerQuote. The structure of the message type CustomerQuoteBasicDataByBuyerAndValidityPeriodResponse_sync is specified by the message data type CustomerQuoteBasicDataByBuyerAndValidityPeriodResponseMessage_sync which is derived from the message data type CustomerQuoteMessage.

Figure 92:
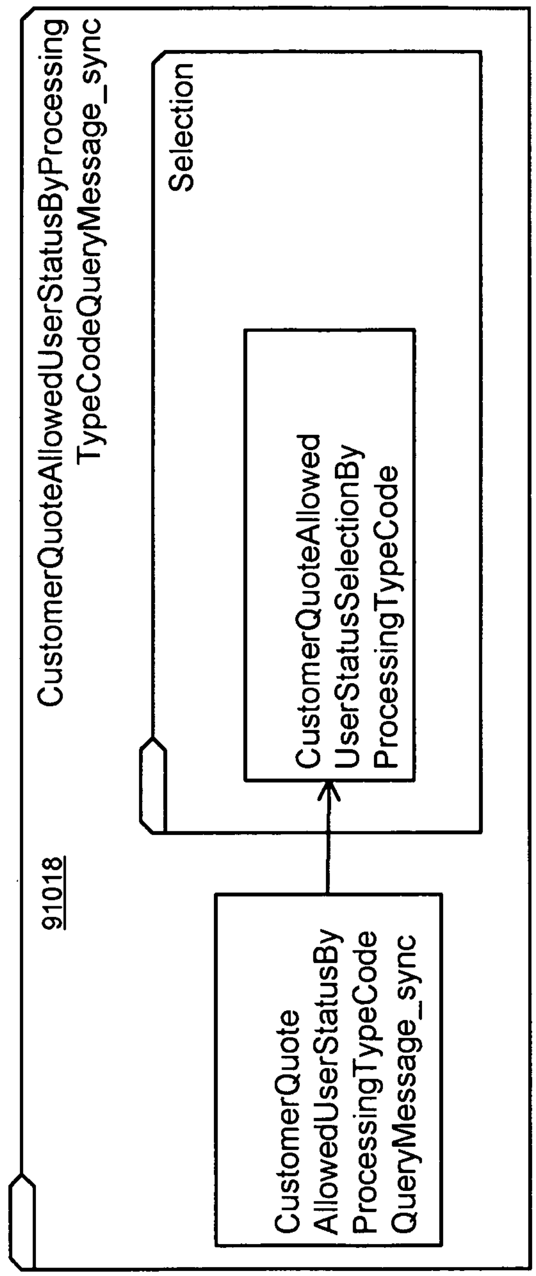
FIG. 92 shows an example CustomerQuoteAllowedUserStatusByProcessingTypeCodeQueryMessage_sync Message Data Type.
Figure 93:
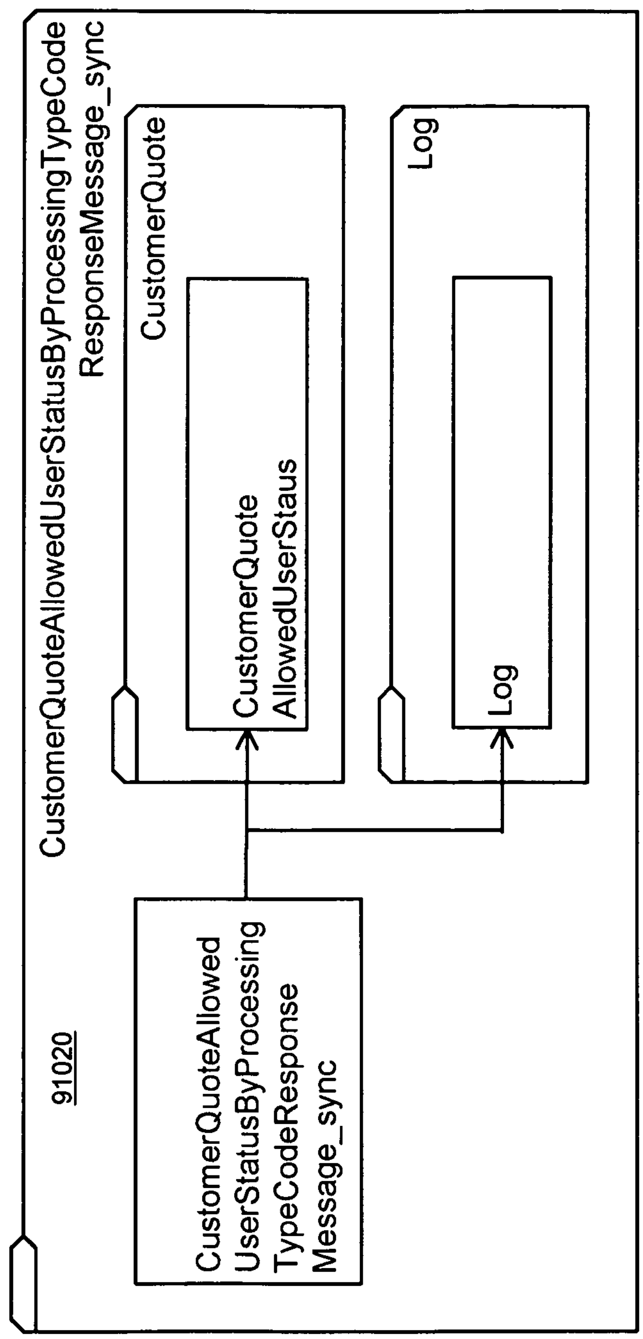
FIG. 93 shows an example CustomerQuoteAllowedUserStatusByProcessingTypeCodeResponseMessage_sync Message Data Type.
Figure 94:
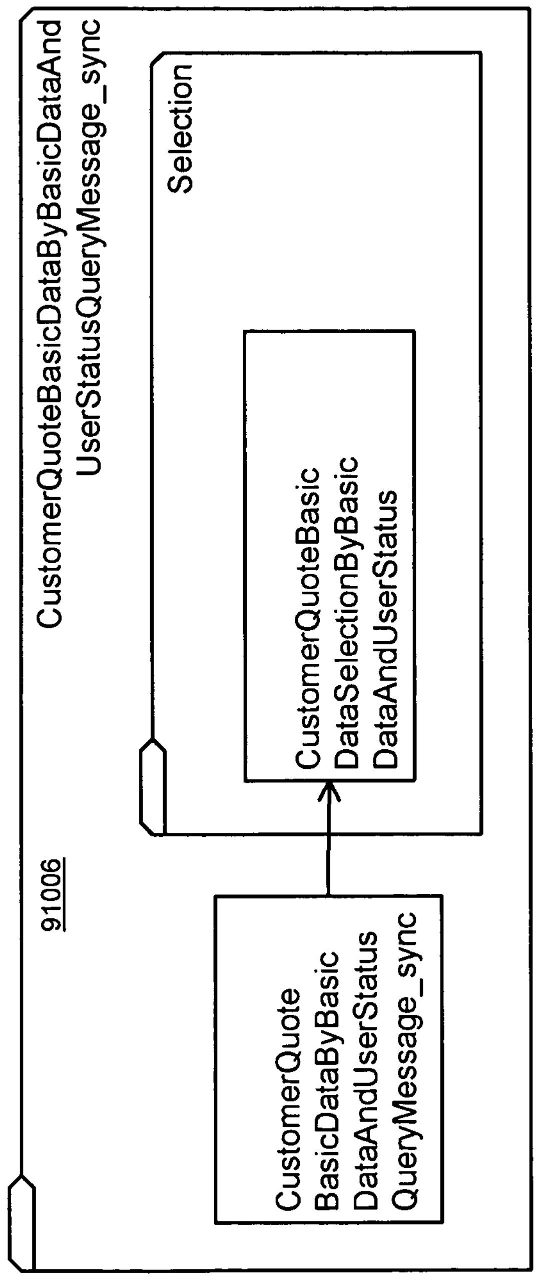
FIG. 94 shows an example CustomerQuoteBasicDataByBasicDataAndUserStatusQueryMessage_sync Message Data Type.
Figure 95:
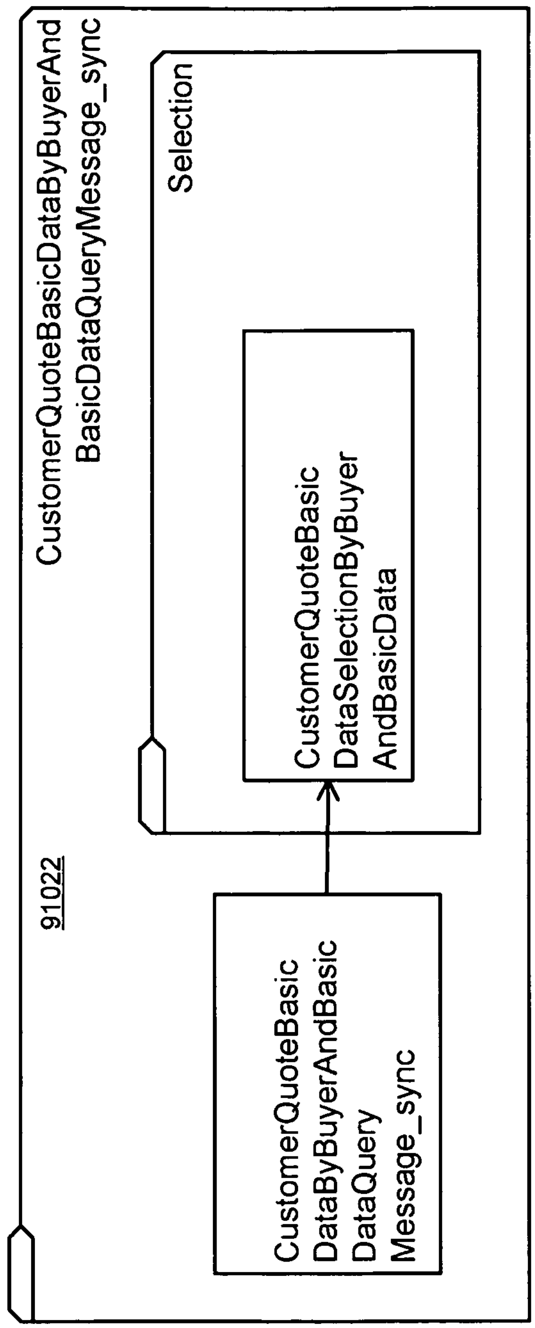
FIG. 95 shows an example CustomerQuoteBasicDataByBuyerAndBasicDataQueryMessage_sync Message Data Type.
Figure 96:
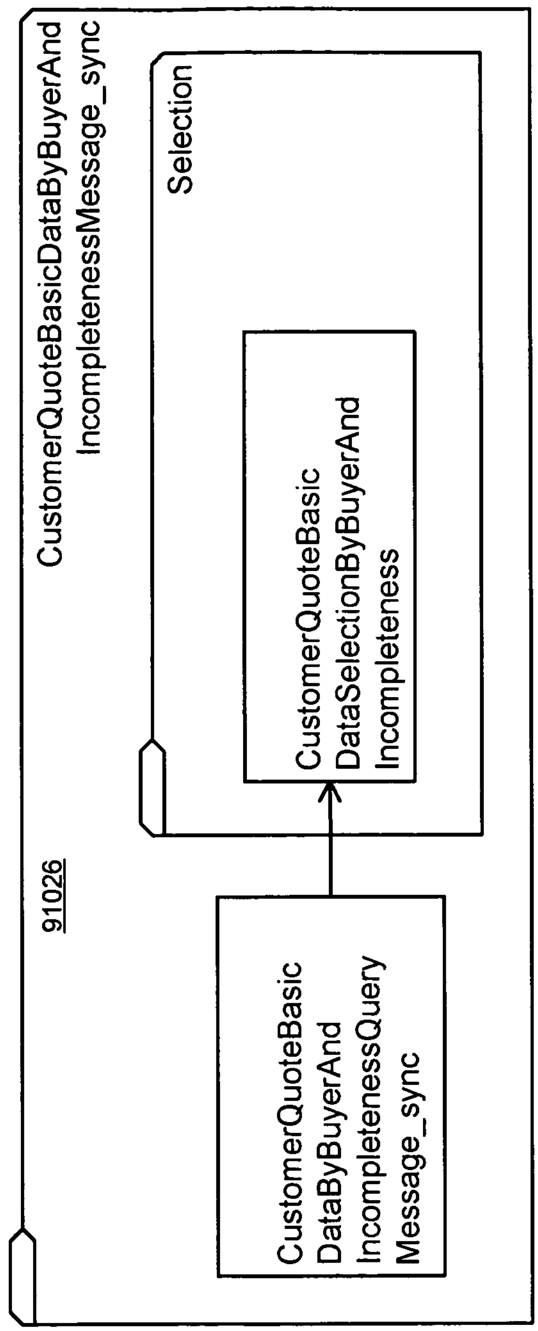
FIG. 96 shows an example CustomerQuoteBasicDataByBuyerAndIncompletenessMessage_sync Message Data Type.
Figure 97:
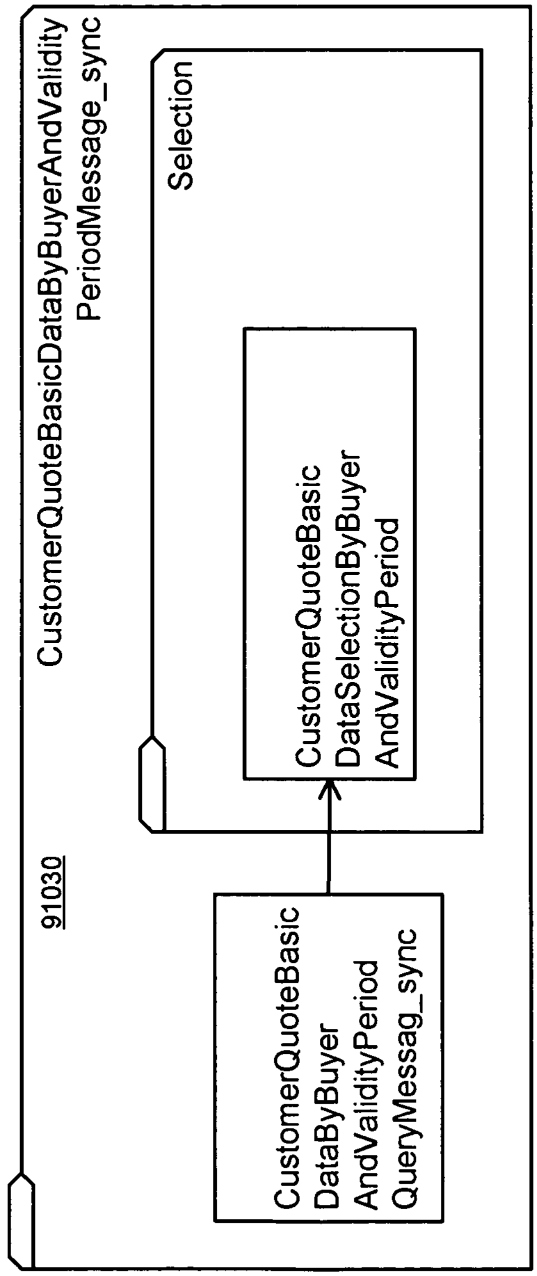
FIG. 97 shows an example CustomerQuoteBasicDataByBuyerAndValidityPeriodMessage_sync Message Data Type.
Figure 98:
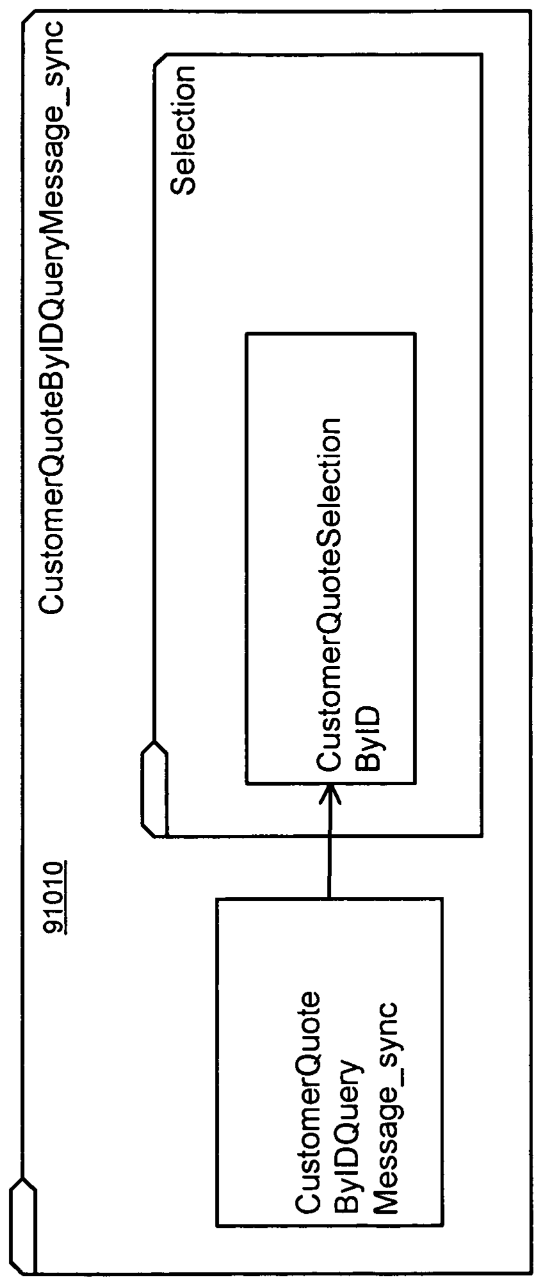
FIG. 98 shows an example CustomerQuoteByIDQueryMessage_sync Message Data Type.

For example, a "Seller" system 91002 can query customer quotes by basic data and user status using the CustomerQuoteBasicDataByBasicDataAndUserStatusQuery_sync message 91006 as shown, for example, in FIG. 94. A "Customer Quote Processing" system 91004 can respond to the query using the CustomerQuoteBasicDataByBasicDataAndUserStatusResponse_sync message 91008. The "Seller" system 91002 can query a customer quote using the CustomerQuoteByIDQuery_sync message 91010 as shown, for example, in FIG. 98. The "Customer Quote Processing" system 91004 can respond to the query using the CustomerQuoteByIDResponse_sync message 91012. The "Seller" system 91002 can request to change customer quote user status using the CustomerQuoteUserStatusChangeRequest_sync message 91014. The "Customer Quote Processing" system 91004 can confirm the request using the CustomerQuoteUserStatusChangeConfirmation_sync message 91016. The "Seller" system 91002 can query customer quotes by processing type codes using the CustomerQuoteAllowedUserStatusByProcessingTypeCodeQuery_sync message 91018 as shown, for example, in FIG. 92. The "Customer Quote Processing" system 91004 can respond to the query using the CustomerQuoteAllowedUserStatusByProcessingTypeCodeResponse_sync message 91020 as shown, for example, in FIG. 93. The "Seller" system 91002 can query customer quotes by buyer and basic data using the CustomerQuoteBasicDataByBuyerAndBasicDataQuery_sync message 91022 as shown, for example, in FIG. 95. The "Customer Quote Processing" system 91004 can respond to the query using the CustomerQuoteBasicDataByBuyerAndBasicDataResponse_sync message 91024. The "Seller" system 91002 can query customer quotes by buyer and incompleteness using the CustomerQuoteBasicDataByBuyerAndIncompletenessQuery_sync message 91026 as shown, for example, in FIG. 96. The "Customer Quote Processing" system 91004 can respond to the query using the CustomerQuoteBasicDataByBuyerAndIncompletenessResponse_sync message 91028. The "Seller" system 91002 can query customer quotes by validity period using the CustomerQuoteBasicDataByBuyerAndValidityPeriodQuery_sync message 91030 as shown, for example, in FIG. 97. The "Customer Quote Processing" system 91004 can respond to the query using the CustomerQuoteBasicDataByBuyerAndValidityPeriodResponse_sync message 91032.

Message Data Type

The message data type CustomerQuoteAllowedUserStatusByProcessingTypeCodeQueryMessage_sync contains the selection included in the business document.

FIG. 99 shows a CustomerQuoteAllowedUserStatusByProcessingTypeCodeQueryMessage_sync 99000 package. The CustomerQuoteAllowedUserStatusByProcessingTypeCodeQueryMessage_sync 99000 package is a CustomerQuoteAllowedUserStatusByProcessingTypeCodeQueryMessage_sync 99004 datatype. The CustomerQuoteAllowedUserStatusByProcessingTypeCodeQueryMessage_sync 99000 package includes a CustomerQuoteAllowedUserStatusByProcessingTypeCodeQueryMessage_sync 99002 entity. The CustomerQuoteAllowedUserStatusByProcessingTypeCodeQueryMessage_sync 99000 package includes a Selection 99020 package. The Selection 99020 package includes a CustomerQuoteAllowedUserStatusSelectionByProcessingTypeCode 99022 entity.

The CustomerQuoteAllowedUserStatusSelectionByProcessingTypeCode 99022 entity has a cardinality of one 99024 meaning that for each instance of the CustomerQuoteAllowedUserStatusByProcessingTypeCodeQueryMessage_sync 99002 entity there is one CustomerQuoteAllowedUserStatusSelectionByProcessingTypeCode 99022 entity. The CustomerQuoteAllowedUserStatus- SelectionByProcessingTypeCode 99022 entity includes a CustomerQuoteProcessingTypeCode 99026 attribute.

The CustomerQuoteProcessingTypeCode 99026 attribute is a BusinessTransactionDocumentProcessingTypeCode 99030 datatype. The CustomerQuoteProcessingTypeCode 99026 attribute has a cardinality of one 99028 meaning that for each instance of the CustomerQuoteAllowedUserStatusSelectionByProcessingTypeCode 99022 entity there is one CustomerQuoteProcessingTypeCode 99026 attribute.

Selection Package

The selection package contains the selection criteria for the CustomerQuoteUserStatus CustomerQuoteAllowedUserStatusSelectionByProcessingTypeCode CustomerQuoteAllowedUserStatusSelectionByProcessingTypeCode specifies the criteria to select a CustomerQuoteUserStatus by CustomerQuoteProcessingTypeCode. CustomerQuoteProcessingTypeCode is a coded representation of a CustomerQuote within the Customer Quote Processing.

Message Data Type

The message data type CustomerQuoteMessage contains the CustomerQuote included in the business document and the information of the message log. The message data type CustomerQuoteMessage, is used as an abstract maximal message data type, which unifies all packages and entities for the following concrete message data types: CustomerQuoteBasicDataByBasicDataAndUserStatusResponseMessage_sync, CustomerQuoteByIDResponseMessage_sync, CustomerQuoteUserStatusChangeRequestMessage_sync, CustomerQuoteUserStatusChangeConfirmationMessage_sync, CustomerQuoteBasicDataByBuyerAndBasicDataResponseMessage_sync, CustomerQuoteBasicDataByBuyerAndIncompleteness ResponseMessage_sync, and CustomerQuoteBasicDataByBuyerAndValidityPeriodResponseMessage_sync.

FIGS. 111-1 through 111-13 show a CustomerQuoteMessage 111000 package. The CustomerQuoteMessage 111000 package is a CustomerQuoteMessage 111004 datatype. The CustomerQuoteMessage 111000 package includes a CustomerQuoteMessage 111002 entity. The CustomerQuoteMessage 111000 package includes various packages, namely CustomerQuote 111020 and Log 1110502.

The CustomerQuote 111020 package includes a CustomerQuote 111022 entity. The CustomerQuote 111020 package includes various packages, namely Party 111062, SalesTerms 1110192, DateTerms 1110222, PricingTerms 1110246, DeliveryTerms 1110264, InvoiceTerms 1110276, TotalValues 1110288 and Item 1110306.

The CustomerQuote 111022 entity has a cardinality of zero or n 111024 meaning that for each instance of the CustomerQuoteMessage 111002 entity there may be one or more CustomerQuote 111022 entities. The CustomerQuote 111022 entity includes various attributes, namely ID 111026, Date 111032, ProcessingTypeCode 111038, ProcessingTypeName 111044, BuyerID 111050 and StatusObject 111056.

The ID 111026 attribute is a CustomerQuoteID 111030 datatype. The ID 111026 attribute has a cardinality of one 111028 meaning that for each instance of the CustomerQuote 111022 entity there is one ID 111026 attribute.

The Date 111032 attribute is a Date,Qualifier:BusinessTransactionDocument 111036 datatype. The Date 111032 attribute has a cardinality of zero or one 111034 meaning that for each instance of the CustomerQuote 111022 entity there may be one Date 111032 attribute.

The ProcessingTypeCode 111038 attribute is a BusinessTransactionDocumentProcessingTypeCode 111042 datatype. The ProcessingTypeCode 111038 attribute has a cardinality of zero or one 111040 meaning that for each instance of the CustomerQuote 111022 entity there may be one ProcessingTypeCode 111038 attribute.

The ProcessingTypeName 111044 attribute is a LEN20_Name,Qualifier:ProcessingType 111048 datatype. The ProcessingTypeName 111044 attribute has a cardinality of zero or one 111046 meaning that for each instance of the CustomerQuote 111022 entity there may be one ProcessingTypeName 111044 attribute.

The BuyerID 111050 attribute is a BusinessTransactionDocumentID 111054 datatype. The BuyerID 111050 attribute has a cardinality of zero or one 111052 meaning that for each instance of the CustomerQuote 111022 entity there may be one BuyerID 111050 attribute.

The StatusObject 111056 attribute is a StatusObject 111060 datatype. The StatusObject 111056 attribute has a cardinality of zero or one 111058 meaning that for each instance of the CustomerQuote 111022 entity there may be one StatusObject 111056 attribute.

The Party 111062 package includes various entities, namely BuyerParty 111064, GoodsRecipientParty 111080, BillToParty 111096, PayerParty 1110112, ResponsibleEmployeeParty 1110128, SalesOrganisationParty 1110144, SalesOfficeParty 1110160 and SalesGroupParty 1110176.

The BuyerParty 111064 entity has a cardinality of one 111066 meaning that for each instance of the CustomerQuote 111022 entity there is one BuyerParty 111064 entity. The BuyerParty 111064 entity includes various attributes, namely InternalID 111068 and FormattedName 111074.

The InternalID 111068 attribute is a PartyInternalID 111072 datatype. The InternalID 111068 attribute has a cardinality of one 111070 meaning that for each instance of the BuyerParty 111064 entity there is one InternalID 111068 attribute.

The FormattedName 111074 attribute is a LONG_Name, Qualifier:PartyFormatted 111078 datatype. The FormattedName 111074 attribute has a cardinality of zero or one 111076 meaning that for each instance of the BuyerParty 111064 entity there may be one FormattedName 111074 attribute.

The GoodsRecipientParty 111080 entity has a cardinality of zero or one 111082 meaning that for each instance of the CustomerQuote 111022 entity there may be one GoodsRecipientParty 111080 entity. The GoodsRecipientParty 111080 entity includes various attributes, namely InternalID 111084 and FormattedName 111090.

The InternalID 111084 attribute is a PartyInternalID 111088 datatype. The InternalID 111084 attribute has a cardinality of one 111086 meaning that for each instance of the GoodsRecipientParty 111080 entity there is one InternalID 111084 attribute.

The FormattedName 111090 attribute is a LONG_Name, Qualifier:PartyFormatted 111094 datatype. The FormattedName 111090 attribute has a cardinality of zero or one 111092 meaning that for each instance of the GoodsRecipientParty 111080 entity there may be one FormattedName 111090 attribute.

The BillToParty 111096 entity has a cardinality of zero or one 111098 meaning that for each instance of the CustomerQuote 111022 entity there may be one BillToParty 111096 entity. The BillToParty 111096 entity includes various attributes, namely InternalID 1110100 and FormattedName 1110106.

The InternalID 1110100 attribute is a PartyInternalID 1110104 datatype. The InternalID 1110100 attribute has a cardinality of one 1110102 meaning that for each instance of the BillToParty 111096 entity there is one InternalID 1110100 attribute.

The FormattedName 1110106 attribute is a LONG_Name, Qualifier:PartyFormatted 1110110 datatype. The FormattedName 1110106 attribute has a cardinality of zero or one 1110108 meaning that for each instance of the BillToParty 111096 entity there may be one FormattedName 1110106 attribute.

The PayerParty 1110112 entity has a cardinality of zero or one 1110114 meaning that for each instance of the CustomerQuote 111022 entity there may be one PayerParty 1110112 entity. The PayerParty 1110112 entity includes various attributes, namely InternalID 1110116 and FormattedName 1110122.

The InternalID 1110116 attribute is a PartyInternalID 1110120 datatype. The InternalID 1110116 attribute has a cardinality of one 1110118 meaning that for each instance of the PayerParty 1110112 entity there is one InternalID 1110116 attribute.

The FormattedName 1110122 attribute is a LONG_Name, Qualifier:PartyFormatted 1110126 datatype. The FormattedName 1110122 attribute has a cardinality of zero or one 1110124 meaning that for each instance of the PayerParty 1110112 entity there may be one FormattedName 1110122 attribute.

The ResponsibleEmployeeParty 1110128 entity has a cardinality of zero or one 1110130 meaning that for each instance of the CustomerQuote 111022 entity there may be one ResponsibleEmployeeParty 1110128 entity. The ResponsibleEmployeeParty 1110128 entity includes various attributes, namely InternalID 1110132 and FormattedName 1110138.

The InternalID 1110132 attribute is a PartyInternalID 1110136 datatype. The InternalID 1110132 attribute has a cardinality of one 1110134 meaning that for each instance of the ResponsibleEmployeeParty 1110128 entity there is one InternalID 1110132 attribute.

The FormattedName 1110138 attribute is a LANGUAGE-INDEPENDENT_LONG_Name,Qualifier:PersonFormatted 1110142 datatype. The FormattedName 1110138 attribute has a cardinality of zero or one 1110140 meaning that for each instance of the ResponsibleEmployeeParty 1110128 entity there may be one FormattedName 1110138 attribute.

The SalesOrganisationParty 1110144 entity has a cardinality of one 1110146 meaning that for each instance of the CustomerQuote 111022 entity there is one SalesOrganisationParty 1110144 entity. The SalesOrganisationParty 1110144 entity includes various attributes, namely InternalID 1110148 and FormattedName 1110154.

The InternalID 1110148 attribute is a PartyInternalID 1110152 datatype. The InternalID 1110148 attribute has a cardinality of one 1110150 meaning that for each instance of the SalesOrganisationParty 1110144 entity there is one InternalID 1110148 attribute.

The FormattedName 1110154 attribute is a LONG_Name, Qualifier:PartyFormatted 1110158 datatype. The FormattedName 1110154 attribute has a cardinality of zero or one 1110156 meaning that for each instance of the SalesOrganisationParty 1110144 entity there may be one FormattedName 1110154 attribute.

The SalesOfficeParty 1110160 entity has a cardinality of zero or one 1110162 meaning that for each instance of the CustomerQuote 111022 entity there may be one SalesOfficeParty 1110160 entity. The SalesOfficeParty 1110160 entity includes various attributes, namely InternalID 1110164 and FormattedName 1110170.

The InternalID 1110164 attribute is a PartyInternalID 1110168 datatype. The InternalID 1110164 attribute has a cardinality of one 1110166 meaning that for each instance of the SalesOfficeParty 1110160 entity there is one InternalID 1110164 attribute.

The FormattedName 1110170 attribute is a LONG_Name, Qualifier:PartyFormatted 1110174 datatype. The FormattedName 1110170 attribute has a cardinality of zero or one 1110172 meaning that for each instance of the SalesOfficeParty 1110160 entity there may be one FormattedName 1110170 attribute.

The SalesGroupParty 1110176 entity has a cardinality of zero or one 1110178 meaning that for each instance of the CustomerQuote 111022 entity there may be one SalesGroupParty 1110176 entity. The SalesGroupParty 1110176 entity includes various attributes, namely InternalID 1110180 and FormattedName 1110186.

The InternalID 1110180 attribute is a PartyInternalID 1110184 datatype. The InternalID 1110180 attribute has a cardinality of one 1110182 meaning that for each instance of the SalesGroupParty 1110176 entity there is one InternalID 1110180 attribute.

The FormattedName 1110186 attribute is a LONG_Name, Qualifier:PartyFormatted 1110190 datatype. The FormattedName 1110186 attribute has a cardinality of zero or one 1110188 meaning that for each instance of the SalesGroupParty 1110176 entity there may be one FormattedName 1110186 attribute.

The SalesTerms 1110192 package includes a SalesTerms 1110194 entity.

The SalesTerms 1110194 entity has a cardinality of zero or one 1110196 meaning that for each instance of the CustomerQuote 111022 entity there may be one SalesTerms 1110194 entity. The SalesTerms 1110194 entity includes various attributes, namely DistributionChannelCode 1110198, DistributionChannelName 1110204, DivisionCode 1110210 and DivisionName 1110216.

The DistributionChannelCode 1110198 attribute is a DistributionChannelCode 1110202 datatype. The DistributionChannelCode 1110198 attribute has a cardinality of zero or one 1110200 meaning that for each instance of the SalesTerms 1110194 entity there may be one DistributionChannelCode 1110198 attribute.

The DistributionChannelName 1110204 attribute is a LEN20_Name,Qualifier:DistributionChannel 1110208 datatype. The DistributionChannelName 1110204 attribute has a cardinality of zero or one 1110206 meaning that for each instance of the SalesTerms 1110194 entity there may be one DistributionChannelName 1110204 attribute.

The DivisionCode 1110210 attribute is a DivisionCode 1110214 datatype. The DivisionCode 1110210 attribute has a cardinality of zero or one 1110212 meaning that for each instance of the SalesTerms 1110194 entity there may be one DivisionCode 1110210 attribute.

The DivisionName 1110216 attribute is a LEN20_Name, Qualifier:Division 1110220 datatype. The DivisionName 1110216 attribute has a cardinality of zero or one 1110218 meaning that for each instance of the SalesTerms 1110194 entity there may be one DivisionName 1110216 attribute.

The DateTerms 1110222 package includes a DateTerms 1110224 entity.

The DateTerms 1110224 entity has a cardinality of zero or one 1110226 meaning that for each instance of the CustomerQuote 111022 entity there may be one DateTerms 1110224 entity. The DateTerms 1110224 entity includes various attributes, namely RequestDate 1110228, ValidityStartDate 1110234 and ValidityEndDate 1110240.

The RequestDate 1110228 attribute is a Date,Qualifier: Request 1110232 datatype. The RequestDate 1110228 attribute has a cardinality of zero or one 1110230 meaning that for each instance of the DateTerms 1110224 entity there may be one RequestDate 1110228 attribute.

The ValidityStartDate 1110234 attribute is a Date,Qualifier:ValidityStart 1110238 datatype. The ValidityStartDate 1110234 attribute has a cardinality of zero or one 1110236 meaning that for each instance of the DateTerms 1110224 entity there may be one ValidityStartDate 1110234 attribute.

The ValidityEndDate 1110240 attribute is a Date,Qualifier: ValidityEnd 1110244 datatype. The ValidityEndDate 1110240 attribute has a cardinality of zero or one 1110242 meaning that for each instance of the DateTerms 1110224 entity there may be one ValidityEndDate 1110240 attribute.

The PricingTerms 1110246 package includes a PricingTerms 1110248 entity.

The PricingTerms 1110248 entity has a cardinality of zero or one 1110250 meaning that for each instance of the CustomerQuote 111022 entity there may be one PricingTerms 1110248 entity. The PricingTerms 1110248 entity includes various attributes, namely CurrencyCode 1110252 and PriceDeterminationDate 1110258.

The CurrencyCode 1110252 attribute is a CurrencyCode 1110256 datatype. The CurrencyCode 1110252 attribute has a cardinality of zero or one 1110254 meaning that for each instance of the PricingTerms 1110248 entity there may be one CurrencyCode 1110252 attribute.

The PriceDeterminationDate 1110258 attribute is a Date, Qualifier:PriceDetermination 1110262 datatype. The PriceDeterminationDate 1110258 attribute has a cardinality of zero or one 1110260 meaning that for each instance of the PricingTerms 1110248 entity there may be one PriceDeterminationDate 1110258 attribute.

The DeliveryTerms 1110264 package includes a DeliveryTerms 1110266 entity.

The DeliveryTerms 1110266 entity has a cardinality of zero or one 1110268 meaning that for each instance of the CustomerQuote 111022 entity there may be one DeliveryTerms 1110266 entity. The DeliveryTerms 1110266 entity includes an Incoterms 1110270 attribute.

The Incoterms 1110270 attribute is an Incoterms 1110274 datatype. The Incoterms 1110270 attribute has a cardinality of zero or one 1110272 meaning that for each instance of the DeliveryTerms 1110266 entity there may be one Incoterms 1110270 attribute.

The InvoiceTerms 1110276 package includes an InvoiceTerms 1110278 entity.

The InvoiceTerms 1110278 entity has a cardinality of zero or one 1110280 meaning that for each instance of the CustomerQuote 111022 entity there may be one InvoiceTerms 1110278 entity. The InvoiceTerms 1110278 entity includes an InvoicingDate 1110282 attribute.

The InvoicingDate 1110282 attribute is a Date,Qualifier: Invoicing 1110286 datatype. The InvoicingDate 1110282 attribute has a cardinality of zero or one 1110284 meaning that for each instance of the InvoiceTerms 1110278 entity there may be one InvoicingDate 1110282 attribute.

The TotalValues 1110288 package includes a TotalValues 1110290 entity.

The TotalValues 1110290 entity has a cardinality of zero or one 1110292 meaning that for each instance of the CustomerQuote 111022 entity there may be one TotalValues 1110290 entity. The TotalValues 1110290 entity includes various attributes, namely GrossWeightMeasure 1110294 and NetAmount 1110300.

The GrossWeightMeasure 1110294 attribute is a Measure, Qualifier:GrossWeight 1110298 datatype. The GrossWeightMeasure 1110294 attribute has a cardinality of zero or one 1110296 meaning that for each instance of the TotalValues 1110290 entity there may be one GrossWeightMeasure 1110294 attribute.

The NetAmount 1110300 attribute is an Amount,Qualifier: Net 1110304 datatype. The NetAmount 1110300 attribute has a cardinality of zero or one 1110302 meaning that for each instance of the TotalValues 1110290 entity there may be one NetAmount 1110300 attribute.

The Item 1110306 package includes an Item 1110308 entity. The Item 1110306 package includes various packages, namely ProductInformation 1110324, Party 1110336, Location 1110418, DeliveryTerms 1110430, InvoiceTerms 1110442 and TotalValues 1110454.

The Item 1110308 entity has a cardinality of zero or n 1110310 meaning that for each instance of the CustomerQuote 111022 entity there may be one or more Item 1110308 entities. The Item 1110308 entity includes various attributes, namely ID 1110312 and Description 1110318.

The ID 1110312 attribute is a CustomerQuoteItemID 1110316 datatype. The ID 1110312 attribute has a cardinality of one 1110314 meaning that for each instance of the Item 1110308 entity there is one ID 1110312 attribute.

The Description 1110318 attribute is a SHORT_Description 1110322 datatype. The Description 1110318 attribute has a cardinality of zero or one 1110320 meaning that for each instance of the Item 1110308 entity there may be one Description 1110318 attribute.

The ProductInformation 1110324 package includes a Product 1110326 entity.

The Product 1110326 entity has a cardinality of zero or one 1110328 meaning that for each instance of the Item 1110308 entity there may be one Product 1110326 entity. The Product 1110326 entity includes a SellerID 1110330 attribute.

The SellerID 1110330 attribute is a ProductPartyID 1110334 datatype. The SellerID 1110330 attribute has a cardinality of one 1110332 meaning that for each instance of the Product 1110326 entity there is one SellerID 1110330 attribute.

The Party 1110336 package includes various entities, namely BuyerParty 1110338, GoodsRecipientParty 1110354, BillToParty 1110370, PayerParty 1110386 and ResponsibleEmployeeParty 1110402.

The BuyerParty 1110338 entity has a cardinality of zero or one 1110340 meaning that for each instance of the Item 1110308 entity there may be one BuyerParty 1110338 entity. The BuyerParty 1110338 entity includes various attributes, namely InternalID 1110342 and FormattedName 1110348.

The InternalID 1110342 attribute is a PartyInternalID 1110346 datatype. The InternalID 1110342 attribute has a cardinality of one 1110344 meaning that for each instance of the BuyerParty 1110338 entity there is one InternalID 1110342 attribute.

The FormattedName 1110348 attribute is a LONG_Name, Qualifier:PartyFormatted 1110352 datatype. The FormattedName 1110348 attribute has a cardinality of zero or one 1110350 meaning that for each instance of the BuyerParty 1110338 entity there may be one FormattedName 1110348 attribute.

The GoodsRecipientParty 1110354 entity has a cardinality of zero or one 1110356 meaning that for each instance of the Item 1110308 entity there may be one GoodsRecipientParty 1110354 entity. The GoodsRecipientParty 1110354 entity includes various attributes, namely InternalID 1110358 and FormattedName 1110364.

The InternalID 1110358 attribute is a PartyInternalID 1110362 datatype. The InternalID 1110358 attribute has a cardinality of one 1110360 meaning that for each instance of the GoodsRecipientParty 1110354 entity there is one InternalID 1110358 attribute.

The FormattedName 1110364 attribute is a LONG_Name, Qualifier:PartyFormatted 1110368 datatype. The FormattedName 1110364 attribute has a cardinality of zero or one 1110366 meaning that for each instance of the GoodsRecipientParty 1110354 entity there may be one FormattedName 1110364 attribute.

The BillToParty 1110370 entity has a cardinality of zero or one 1110372 meaning that for each instance of the Item 1110308 entity there may be one BillToParty 1110370 entity. The BillToParty 1110370 entity includes various attributes, namely InternalID 1110374 and FormattedName 1110380.

The InternalID 1110374 attribute is a PartyInternalID 1110378 datatype. The InternalID 1110374 attribute has a cardinality of one 1110376 meaning that for each instance of the BillToParty 1110370 entity there is one InternalID 1110374 attribute.

The FormattedName 1110380 attribute is a LONG_Name, Qualifier:PartyFormatted 1110384 datatype. The FormattedName 1110380 attribute has a cardinality of zero or one 1110382 meaning that for each instance of the BillToParty 1110370 entity there may be one FormattedName 1110380 attribute.

The PayerParty 1110386 entity has a cardinality of zero or one 1110388 meaning that for each instance of the Item 1110308 entity there may be one PayerParty 1110386 entity. The PayerParty 1110386 entity includes various attributes, namely InternalID 1110390 and FormattedName 1110396.

The InternalID 1110390 attribute is a PartyInternalID 1110394 datatype. The InternalID 1110390 attribute has a cardinality of one 1110392 meaning that for each instance of the PayerParty 1110386 entity there is one InternalID 1110390 attribute.

The FormattedName 1110396 attribute is a LONG_Name, Qualifier:PartyFormatted 1110400 datatype. The FormattedName 1110396 attribute has a cardinality of zero or one 1110398 meaning that for each instance of the PayerParty 1110386 entity there may be one FormattedName 1110396 attribute.

The ResponsibleEmployeeParty 1110402 entity has a cardinality of zero or one 1110404 meaning that for each instance of the Item 1110308 entity there may be one ResponsibleEmployeeParty 1110402 entity. The ResponsibleEmployeeParty 1110402 entity includes various attributes, namely InternalID 1110406 and FormattedName 1110412.

The InternalID 1110406 attribute is a PartyInternalID 1110410 datatype. The InternalID 1110406 attribute has a cardinality of one 1110408 meaning that for each instance of the ResponsibleEmployeeParty 1110402 entity there is one InternalID 1110406 attribute.

The FormattedName 1110412 attribute is a LANGUAGE-INDEPENDENT_LONG_Name,Qualifier:PersonFormatted 1110416 datatype. The FormattedName 1110412 attribute has a cardinality of zero or one 1110414 meaning that for each instance of the ResponsibleEmployeeParty 1110402 entity there may be one FormattedName 1110412 attribute.

The Location 1110418 package includes a ShipToLocation 1110420 entity.

The ShipToLocation 1110420 entity has a cardinality of zero or one 1110422 meaning that for each instance of the Item 1110308 entity there may be one ShipToLocation 1110420 entity. The ShipToLocation 1110420 entity includes a BuyerID 1110424 attribute.

The BuyerID 1110424 attribute is a LocationPartyID 1110428 datatype. The BuyerID 1110424 attribute has a cardinality of zero or one 1110426 meaning that for each instance of the ShipToLocation 1110420 entity there may be one BuyerID 1110424 attribute.

The DeliveryTerms 1110430 package includes a DeliveryTerms 1110432 entity.

The DeliveryTerms 1110432 entity has a cardinality of zero or one 1110434 meaning that for each instance of the Item 1110308 entity there may be one DeliveryTerms 1110432 entity. The DeliveryTerms 1110432 entity includes an Incoterms 1110436 attribute.

The Incoterms 1110436 attribute is an Incoterms 1110440 datatype. The Incoterms 1110436 attribute has a cardinality of zero or one 1110438 meaning that for each instance of the DeliveryTerms 1110432 entity there may be one Incoterms 1110436 attribute.

The InvoiceTerms 1110442 package includes an InvoiceTerms 1110444 entity.

The InvoiceTerms 1110444 entity has a cardinality of zero or one 1110446 meaning that for each instance of the Item 1110308 entity there may be one InvoiceTerms 1110444 entity. The InvoiceTerms 1110444 entity includes an InvoiceDate 1110448 attribute.

The InvoiceDate 1110448 attribute is a Date,Qualifier: Invoicing 1110452 datatype. The InvoiceDate 1110448 attribute has a cardinality of zero or one 1110450 meaning that for each instance of the InvoiceTerms 1110444 entity there may be one InvoiceDate 1110448 attribute.

The TotalValues 1110454 package includes a TotalValues 1110456 entity.

The TotalValues 1110456 entity has a cardinality of zero or one 1110458 meaning that for each instance of the Item 1110308 entity there may be one TotalValues 1110456 entity. The TotalValues 1110456 entity includes various attributes, namely RequestedQuantity 1110460, ConfirmedQuantity 1110466, GrossWeightMeasure 1110472, NetWeightMeasure 1110478, VolumeMeasure 1110484, NetAmount 1110490 and NetPrice 1110496.

The RequestedQuantity 1110460 attribute is a Quantity, Qualifier:Requested 1110464 datatype. The RequestedQuantity 1110460 attribute has a cardinality of zero or one 1110462 meaning that for each instance of the TotalValues 1110456 entity there may be one RequestedQuantity 1110460 attribute.

The ConfirmedQuantity 1110466 attribute is a Quantity, Qualifier:Confirmed 1110470 datatype. The ConfirmedQuantity 1110466 attribute has a cardinality of zero or one 1110468 meaning that for each instance of the TotalValues 1110456 entity there may be one ConfirmedQuantity 1110466 attribute.

The GrossWeightMeasure 1110472 attribute is a Measure, Qualifier:GrossWeight 1110476 datatype. The GrossWeightMeasure 1110472 attribute has a cardinality of zero or one 1110474 meaning that for each instance of the TotalValues 1110456 entity there may be one GrossWeightMeasure 1110472 attribute.

The NetWeightMeasure 1110478 attribute is a Measure, Qualifier:NetWeight 1110482 datatype. The NetWeightMeasure 1110478 attribute has a cardinality of zero or one

1110480 meaning that for each instance of the TotalValues 1110456 entity there may be one NetWeightMeasure 1110478 attribute.

The VolumeMeasure 1110484 attribute is a Measure, Qualifier:Volume 1110488 datatype. The VolumeMeasure 1110484 attribute has a cardinality of zero or one 1110486 meaning that for each instance of the TotalValues 1110456 entity there may be one VolumeMeasure 1110484 attribute.

The NetAmount 1110490 attribute is an Amount,Qualifier: Net 1110494 datatype. The NetAmount 1110490 attribute has a cardinality of zero or one 1110492 meaning that for each instance of the TotalValues 1110456 entity there may be one NetAmount 1110490 attribute.

The NetPrice 1110496 attribute is a Price,Qualifier:Net 1110500 datatype. The NetPrice 1110496 attribute has a cardinality of zero or one 1110498 meaning that for each instance of the TotalValues 1110456 entity there may be one NetPrice 1110496 attribute.

The Log 1110502 package is a Log 1110508 datatype. The Log 1110502 package includes a Log 1110504 entity.

The Log 1110504 entity has a cardinality of zero or one 1110506 meaning that for each instance of the CustomerQuoteMessage 111002 entity there may be one Log 1110504 entity.

CustomerQuote-Package

The CustomerQuote package groups the CustomerQuote with its packages:

CustomerQuote

A CustomerQuote is an offer from a seller to a customer regarding the delivery of goods at a certain price, for a certain quantity and at a certain time. The offer is binding for the seller for a certain time period. Information that applies to the entire CustomerQuote such as the parties involved, the sales/delivery/invoicing-specific agreements, status and references. The CustomerQuoteItems with the item information and dependent data such as the product information, the parties involved, the sales/delivery/invoicing-specific agreements, status and references. ID is the unique identifier of a CustomerQuote. Date is the date at which a CustomerQuote becomes effective from a business perspective. ProcessingTypeCode is a coded representation of a CustomerQuote within the Customer Quote Processing. ProcessingTypeName is a name for the ProcessingTypeCode. BuyerID is the unique identifier assigned by the buyer for a CustomerQuote. StatusObject describes the processing status of a CustomerQuote from the General Status Management point of view.

Party Package

A Party package groups together all the business parties involved in the CustomerQuote.

BuyerParty

A BuyerParty is a party that purchases goods. InternalID is a proprietary identifier for a party. FormattedName is a formatted name of a party.

GoodsRecipientParty

A GoodsRecipientParty is a party for which goods are delivered. InternalID is a proprietary identifier for a party. FormattedName is a formatted name of a party.

BillToParty

A BillToParty is a party that receives the invoice for goods. InternalID is a proprietary identifier for a party. FormattedName is a formatted name of a party.

PayerParty

A PayerParty is a party that pays for goods.

ResponsibleEmployeeParty

A ResponsibleEmployeeParty is an Employee of the sales party that is responsible for handling sales. InternalID is a proprietary identifier for a party. FormattedName is a formatted name of a party.

SalesOrganisationParty

A SalesOrganisationParty is a party that is responsible for selling goods. InternalID is a proprietary identifier for a party. FormattedName is a formatted name of a party.

SalesOfficeParty

A SalesOfficeParty is a party that is responsible for selling goods within a given geographical area. InternalID is a proprietary identifier for a party. FormattedName is a formatted name of a party.

SalesGroupParty

A SalesGroupParty is a party that identifies a group of sales people responsible for processing sales of certain products. InternalID is a proprietary identifier for a party. FormattedName is a formatted name of a party.

SalesTerms Package

A SalesTerms package groups the sales terms of a CustomerQuote.

SalesTerms

SalesTerms are agreements and conditions that apply for selling goods in the CustomerQuote. DistributionChannelCode is a coded representation of a distribution channel via which the goods or services are made available to the customer. DistributionChannelName is a name of a DistributionChannel. DivisionCode is a coded representation of a division that defines the responsibility for sales or profit for saleable materials or services. DivisionName is a name of a Division.

DateTerms Package

A DateTerms package groups the date terms of a CustomerQuote.

DateTerms

DateTerms are agreements regarding dates and durations for goods that can occur at header level in a CustomerQuote document. RequestDate is a time point at which a product is requested to be delivered. ValidityStartDate is the specification of an exact day in the Gregorian calendar. It is the start date of validity. ValidityEndDate is the specification of an exact day in the Gregorian calendar. It is the end date of validity.

PricingTerms Package

A PricingTerms package groups the information required for pricing a CustomerQuote.

PricingTerms

PricingTerms are the characteristics used for pricing and value dating goods in the CustomerQuote document. CurrencyCode is a currency for value dating the ordered goods and services. PriceDeterminationDate is a pricing date on which prices are determined with a rule for automatic scheduling.

DeliveryTerms Package

A DeliveryTerms package groups the delivery agreements for a CustomerQuote.

DeliveryTerms

DeliveryTerms are the agreements that apply for delivering goods in the CustomerQuote.

Incoterms are typical contract formulations for delivery conditions that correspond to the rules defined by the International Chamber of Commerce (ICC).

InvoiceTerms Package

An InvoiceTerms package groups the invoice agreements for a CustomerQuote.

InvoicingDate is the date at which the process of issuing invoices is supposed to be started.

TotalValues Package

A Total Values package groups the cumulated total values of a CustomerQuote.

TotalValues

TotalValues are the cumulated total values that occur in a CustomerQuote, for example, the total gross and net weight, volume, gross and net amount, tax amount, and freight costs.

GrossWeightMeasure is the total gross weight of the CustomerQuote. NetAmount is the total net amount of the CustomerQuote.

Item Package

The Item package groups the CustomerQuoteItem with its packages:

Item

An Item is the item in a CustomerQuote that focuses on the delivery of goods, the prices and the preparatory steps for invoicing. Item is the identifying and administrative item information in a CustomerQuote which contains all the data that applies to the item, for example, the product information, the parties involved, the sales/delivery/invoicing-specific agreements, status and references, and so on. The ID is the unique identifier for an item in the CustomerQuote. Description is a description of an item in a CustomerQuote.

ProductInformation Package

A ProductInformation package groups the product information of a CustomerQuote Item.

Product

Product is the identification, description and classification of the product in a CustomerQuote Item. SellerID is an identifier for a product assigned by the seller.

Party Package

A Party package groups together all the business parties involved in the CustomerQuoteItem.

BuyerParty

A BuyerParty is a party that purchases goods. InternalID is a proprietary identifier for a party. FormattedName is a formatted name of a party.

GoodsRecipientParty

A GoodsRecipientParty is a party for which goods are delivered. InternalID is a proprietary identifier for a party. FormattedName is a formatted name of a party.

BillToParty

A BillToParty is a party that receives the invoice for goods. InternalID is a proprietary identifier for a party. FormattedName is a formatted name of a party.

PayerParty

A PayerParty is a party that pays for goods. InternalID is a proprietary identifier for a party. FormattedName is a formatted name of a party.

ResponsibleEmployeeParty

A ResponsibleEmployeeParty is an Employee of the sales party that is responsible for handling sales. InternalID is a proprietary identifier for a party. FormattedName is a formatted name of a party.

Location Package

The Location package groups together all participating locations for a CustomerQuoteItem.

ShipToLocation

A ShipToLocation is a location to which goods are shipped. The BuyerID is the identifier for a ShipToLocation assigned by the buyer party.

DeliveryTerms Package

A DeliveryTerms package groups the delivery agreement information for a CustomerQuoteItem.

DeliveryTerms

DeliveryTerms are the item-specific agreements that apply for delivering goods in the CustomerQuote document. Incoterms are typical contract formulations for delivery conditions that correspond to the rules defined by the International Chamber of Commerce (ICC).

InvoiceTerms Package

An InvoiceTerms package groups the invoice agreements for a CustomerQuoteItem.

InvoiceTerms

InvoiceTerms are the agreements that apply for invoicing goods in the CustomerQuoteItem. InvoicingDate is the date at which the process of issuing invoices is supposed to be started.

TotalValues Package

A TotalValues package groups the total values information of a CustomerQuoteItem.

TotalValues

TotalValues are the total values of an item that result from dependent nodes of the item, for example the entire desired delivery quantity or confirmed quantity, the item-specific gross and net weight, volume, gross and net amount. RequestedQuantity is a quantity that is requested for an item in a CustomerQuote. ConfirmedQuantity is a quantity that is confirmed for an item in a CustomerQuote. GrossWeightMeasure is a gross weight of the product in an item in a CustomerQuote. NetWeightMeasure is a net weight of the product in an item in a CustomerQuote. VolumeMeasure is the volume of the product in an item in a CustomerQuote.

NetAmount is the net amount of an item in a CustomerQuote. NetPrice is the net price of a CustomerQuoteItem product referred to a base quantity.

Log-Package

A Log package groups the messages used for user interaction.

Log

A log is a sequence of messages that result when an application executes a task.

Message Data Type

The message data type CustomerQuoteBasicDataByBasicDataAndUserStatusQueryMessage_sync contains the selection included in the business document.

FIGS. 101-1 through 101-3 show a CustomerQuoteBasicDataByBasicDataAndUserStatusQueryMessage_sync 101000 package. The CustomerQuoteBasicDataByBasicDataAndUserStatusQueryMessage_sync 101000 package is a CustomerQuoteBasicDataByBasicDataAndUserStatusQueryMessage_sync 101004 datatype. The CustomerQuoteBasicDataByBasicDataAndUserStatusQueryMessage_sync 101000 package includes a CustomerQuoteBasicDataByBasicDataAndUserStatusQueryMessage_sync 101002 entity. The CustomerQuoteBasicDataByBasicDataAndUserStatusQueryMessage_sync 101000 package includes a Selection 101020 package.

The Selection 101020 package includes a CustomerQuoteBasicDataSelectionByBasicDataAndUserStatus 101022 entity.

The CustomerQuoteBasicDataSelectionByBasicDataAndUserStatus 101022 entity has a cardinality of one 101024 meaning that for each instance of the CustomerQuoteBasicDataByBasicDataAndUserStatusQueryMessage_sync 101002 entity there is one CustomerQuoteBasicDataSelectionByBasicDataAndUserStatus 101022 entity. The CustomerQuoteBasicDataSelectionByBasicDataAndUserStatus 101022 entity includes various attributes, namely CustomerQuoteProcessingTypeCode 101026, CustomerQuoteBuyerPartyInternalID 101032, CustomerQuoteSalesOrganisationPartyInternalID 101038, CustomerQuoteSalesOfficePartyInternalID 101044, CustomerQuoteSalesGroupPartyInternalID 101050, CustomerQuoteSalesTermsDistributionChannelCode 101056, CustomerQuoteSalesTermsDivisionCode 101062, CustomerQuoteStatusObjectUserStatusProfileCode 101068 and CustomerQuoteStatusObjectUserStatusCode 101074.

The CustomerQuoteProcessingTypeCode 101026 attribute is a BusinessTransactionDocumentProcessingTypeCode 101030 datatype. The CustomerQuoteProcessingTypeCode 101026 attribute has a cardinality of zero or one 101028 meaning that for each instance of the CustomerQuoteBasicDataSelectionByBasicDataAndUserStatus 101022 entity there may be one CustomerQuoteProcessingTypeCode 101026 attribute.

The CustomerQuoteBuyerPartyInternalID 101032 attribute is a PartyInternalID 101036 datatype. The CustomerQuoteBuyerPartyInternalID 101032 attribute has a cardinality of zero or one 101034 meaning that for each instance of the CustomerQuoteBasicDataSelectionByBasicDataAndUserStatus 101022 entity there may be one CustomerQuoteBuyerPartyInternalID 101032 attribute.

The CustomerQuoteSalesOrganisationPartyInternalID 101038 attribute is a PartyInternalID 101042 datatype. The CustomerQuoteSalesOrganisationPartyInternalID 101038 attribute has a cardinality of zero or one 101040 meaning that for each instance of the CustomerQuoteBasicDataSelectionByBasicDataAndUserStatus 101022 entity there may be one CustomerQuoteSalesOrganisationPartyInternalID 101038 attribute.

The CustomerQuoteSalesOfficePartyInternalID 101044 attribute is a PartyInternalID 101048 datatype. The CustomerQuoteSalesOfficePartyInternalID 101044 attribute has a cardinality of zero or one 101046 meaning that for each instance of the CustomerQuoteBasicDataSelectionByBasicDataAndUserStatus 101022 entity there may be one CustomerQuoteSalesOfficePartyInternalID 101044 attribute.

The CustomerQuoteSalesGroupPartyInternalID 101050 attribute is a PartyInternalID 101054 datatype. The CustomerQuoteSalesGroupPartyInternalID 101050 attribute has a cardinality of zero or one 101052 meaning that for each instance of the CustomerQuoteBasicDataSelectionByBasicDataAndUserStatus 101022 entity there may be one CustomerQuoteSalesGroupPartyInternalID 101050 attribute.

The CustomerQuoteSalesTermsDistributionChannelCode 101056 attribute is a DistributionChannelCode 101060 datatype. The CustomerQuoteSalesTermsDistributionChannelCode 101056 attribute has a cardinality of zero or one 101058 meaning that for each instance of the CustomerQuoteBasicDataSelectionByBasicDataAndUserStatus 101022 entity there may be one CustomerQuoteSalesTermsDistributionChannelCode 101056 attribute.

The CustomerQuoteSalesTermsDivisionCode 101062 attribute is a DivisionCode 101066 datatype. The CustomerQuoteSalesTermsDivisionCode 101062 attribute has a cardinality of zero or one 101064 meaning that for each instance of the CustomerQuoteBasicDataSelectionByBasicDataAndUserStatus 101022 entity there may be one CustomerQuoteSalesTermsDivisionCode 101062 attribute.

The CustomerQuoteStatusObjectUserStatusProfileCode 101068 attribute is an UserStatusProfileCode 101072 datatype. The CustomerQuoteStatusObjectUserStatusProfileCode 101068 attribute has a cardinality of zero or one 101070 meaning that for each instance of the CustomerQuoteBasicDataSelectionByBasicDataAndUserStatus 101022 entity there may be one CustomerQuoteStatusObjectUserStatusProfileCode 101068 attribute.

The CustomerQuoteStatusObjectUserStatusCode 101074 attribute is an UserStatusCode 101078 datatype. The CustomerQuoteStatusObjectUserStatusCode 101074 attribute has a cardinality of zero or one 101076 meaning that for each instance of the CustomerQuoteBasicDataSelectionByBasicDataAndUserStatus 101022 entity there may be one CustomerQuoteStatusObjectUserStatusCode 101074 attribute.

Selection Package

The selection package contains the attributes of CustomerQuotes.

CustomerQuoteBasicDataSelectionByBasicDataAndStatus

CustomerQuoteBasicDataSelectionByBasicDataAndUserStatus specifies the criteria to select CustomerQuotes by BasicData and UserStatus attributes. CustomerQuoteProcessingTypeCode is a coded representation of a CustomerQuote within the Customer Quote Processing. CustomerQuoteBuyerPartyInternalID is a proprietary identifier for a party. CustomerQuoteSalesOrganisationPartyInternalID is an identifier that is assigned by the SellerParty for the SalesOrganisationParty. CustomerQuoteSalesOfficePartyInternalID is a proprietary identifier for a party. CustomerQuoteSalesGroupPartyInternalID is a proprietary identifier for a party. CustomerQuoteSalesTermsDistributionChannelCode is a coded representation of a distribution channel via which the goods or services are made available to the customer. CustomerQuoteSalesTermsDivisionCode is a coded representation of a division that defines the responsibility for sales or profit for saleable materials or services. CustomerQuoteStatusObjectUserStatusProfileCode is a coded representation of a user status profile that defines a combination of user statuses, which is defined under the aspect of processing control. CustomerQuoteStatusObjectUserStatusCode is a coded representation of a user status that defines user defined processing status.

Message Data Type

The message data type CustomerQuoteByIDQueryMessage_sync contains the selection included in the business document.

FIG. 109 shows a CustomerQuoteByIDQueryMessage_sync 109000 package. The CustomerQuoteByIDQueryMessage_sync 109000 package is a CustomerQuoteByIDQueryMessage_sync 109004 datatype. The CustomerQuoteByIDQueryMessage_sync 109000 package includes a CustomerQuoteByIDQueryMessage_sync 109002 entity. The CustomerQuoteByIDQueryMessage_sync 109000 package includes a Selection 109020 package.

The Selection 109020 package includes a CustomerQuoteSelectionByID 109022 entity. The CustomerQuoteSelectionByID 109022 entity has a cardinality of one 109024 meaning that for each instance of the CustomerQuoteByIDQueryMessage_sync 109002 entity there is one CustomerQuoteSelectionByID 109022 entity. The CustomerQuoteSelectionByID 109022 entity includes a CustomerQuoteID 109026 attribute.

The CustomerQuoteID 109026 attribute is a CustomerQuoteID 109030 datatype. The CustomerQuoteID 109026 attribute has a cardinality of one 109028 meaning that for each instance of the CustomerQuoteSelectionByID 109022 entity there is one CustomerQuoteID 109026 attribute.

Selection Package

The selection package contains the selection criteria for the CustomerQuote.

CustomerQuoteSelectionByID

CustomerQuoteSelectionByID specifies the criteria to select a CustomerQuote by CustomerQuoteID. CustomerQuoteID is the unique identifier for a CustomerQuote.

Message Data Type

The message data type CustomerQuoteAllowedUserStatusByProcessingTypeCodeResponseMessage_sync contains the CustomerQuote included in the business document. FIGS. 100-1 through 100-2 show a CustomerQuoteAllowedUserStatusByProcessingTypeCodeResponseMessage_sync 100000 package. The CustomerQuoteAllowedUserStatusByProcessingTypeCodeResponseMessage_sync 100000 package is a CustomerQuoteAllowedUserStatusByProcessingTypeCodeResponseMessage_sync 100004 datatype. The CustomerQuoteAllowedUserStatusByProcessingTypeCodeResponseMessage_sync 100000 package includes a CustomerQuoteAllowedUserStatusByProcessingTypeCodeResponseMessage_sync 100002 entity. The CustomerQuoteAllowedUserStatusByProcessingTypeCodeResponseMessage_sync 100000 package includes various packages, namely CustomerQuote 100020 and Log 100056.

The CustomerQuote 100020 package includes a CustomerQuoteAllowedUserStatus 100022 entity. The CustomerQuoteAllowedUserStatus 100022 entity has a cardinality of zero or n 100024 meaning that for each instance of the CustomerQuoteAllowedUserStatusByProcessingTypeCodeResponseMessage_sync 100002 entity there may be one or more CustomerQuoteAllowedUserStatus 100022 entities. The CustomerQuoteAllowedUserStatus 100022 entity includes various attributes, namely UserStatusProfileCode 100026, UserStatusProfileName 100032, UserStatusCode 100038, UserStatusName 100044 and UserStatusOrdinalNumberValue 100050.

The UserStatusProfileCode 100026 attribute is an UserStatusProfileCode 100030 datatype. The UserStatusProfileCode 100026 attribute has a cardinality of one 100028 meaning that for each instance of the CustomerQuoteAllowedUserStatus 100022 entity there is one UserStatusProfileCode 100026 attribute. The UserStatusProfileName 100032 attribute is a LEN30_Name 100036 datatype. The UserStatusProfileName 100032 attribute has a cardinality of one 100034 meaning that for each instance of the CustomerQuoteAllowedUserStatus 100022 entity there is one UserStatusProfileName 100032 attribute. The UserStatusCode 100038 attribute is an UserStatusCode 100042 datatype. The UserStatusCode 100038 attribute has a cardinality of one 100040 meaning that for each instance of the CustomerQuoteAllowedUserStatus 100022 entity there is one UserStatusCode 100038 attribute. The UserStatusName 100044 attribute is a LEN30_Name 100048 datatype. The UserStatusName 100044 attribute has a cardinality of one 100046 meaning that for each instance of the CustomerQuoteAllowedUserStatus 100022 entity there is one UserStatusName 100044 attribute.

The UserStatusOrdinalNumberValue 100050 attribute is an OrdinalNumberValue 100054 datatype. The UserStatusOrdinalNumberValue 100050 attribute has a cardinality of one 100052 meaning that for each instance of the CustomerQuoteAllowedUserStatus 100022 entity there is one UserStatusOrdinalNumberValue 100050 attribute. The Log 100056 package is a Log 100062 datatype. The Log 100056 package includes a Log 100058 entity. The Log 100058 entity has a cardinality of one 100060 meaning that for each instance of the CustomerQuoteAllowedUserStatusByProcessingTypeCodeResponseMessage_sync 100002 entity there is one Log 100058 entity.

CustomerQuote Package

The CustomerQuote package groups the CustomerQuote information.

CustomerQuoteAllowedUserStatus

CustomerQuoteAllowedUserStatus groups the information about user statuses which can be used in a CustomerQuote with a specific ProcessingTypeCode. UserStatusProfileCode is a coded representation of a UserStatusProfile. UserStatusProfileName is a name of the UserStatusProfile. UserStatusCode is a coded representation of a UserStatus. UserStatusName is a name of the UserStatus. UserStatusOrdinalNumberValue is the ordinal number of a user status within UserStatusProfile.

Log-Package

A Log package groups the messages used for user interaction.

Log

A log is a sequence of messages that result when an application executes a task.

Message Data Type

The message data type CustomerQuoteBasicDataByBuyerAndBasicDataQueryMessage_sync contains the selection included in the business document. FIGS. 103-1 through 103-2 show a CustomerQuoteBasicDataByBuyerAndBasicDataQueryMessage_sync 103000 package. The CustomerQuoteBasicDataByBuyerAndBasicDataQueryMessage_sync 103000 package is a CustomerQuoteBasicDataByBuyerAndBasicDataQueryMessage_sync 103004 datatype. The CustomerQuoteBasicDataByBuyerAndBasicDataQueryMessage_sync 103000 package includes a CustomerQuoteBasicDataByBuyerAndBasicDataQueryMessage_sync 103002 entity. The CustomerQuoteBasicDataByBuyerAndBasicDataQueryMessage_sync 103000 package includes a Selection 103020 package. The Selection 103020 package includes a CustomerQuoteBasicDataSelectionByBuyerAndBasicData 103022 entity. The CustomerQuoteBasicDataSelectionByBuyerAndBasicData 103022 entity has a cardinality of one 103024 meaning that for each instance of the CustomerQuoteBasicDataByBuyerAndBasicDataQueryMessage_sync 103002 entity there is one CustomerQuoteBasicDataSelectionByBuyerAndBasicData 103022 entity. The CustomerQuoteBasicDataSelectionByBuyerAndBasicData 103022 entity includes various attributes, namely CustomerQuoteBuyerPartyInternalID 103026, CustomerQuoteSalesOrganisationPartyInternalID 103032, CustomerQuoteSalesOfficePartyInternalID 103038, CustomerQuoteSalesGroupPartyInternalID 103044, CustomerQuoteProcessingTypeCode 103050, CustomerQuoteSalesTermsDistributionChannelCode 103056 and CustomerQuoteSalesTermsDivisionCode 103062.

The CustomerQuoteBuyerPartyInternalID 103026 attribute is a PartyInternalID 103030 datatype. The CustomerQuoteBuyerPartyInternalID 103026 attribute has a cardinality of one 103028 meaning that for each instance of the CustomerQuoteBasicDataSelectionByBuyerAndBasicData 103022 entity there is one CustomerQuoteBuyerPartyInternalID 103026 attribute. The CustomerQuoteSalesOrganisationPartyInternalID 103032 attribute is a PartyInternalID 103036 datatype. The CustomerQuoteSalesOrganisationPartyInternalID 103032 attribute has a cardinality of zero or one 103034 meaning that for each instance of the CustomerQuoteBasicDataSelectionByBuyerAndBasicData 103022 entity there may be one CustomerQuoteSalesOrganisationPartyInternalID 103032 attribute. The CustomerQuoteSalesOfficePartyInternalID 103038 attribute is a PartyInternalID 103042 datatype. The CustomerQuoteSalesOfficePartyInternalID 103038 attribute has a cardinality of zero or one 103040 meaning that for each instance of the CustomerQuoteBasicDataSelectionByBuyerAndBasicData 103022 entity there may be one CustomerQuoteSalesOfficePartyInternalID 103038 attribute. The CustomerQuoteSalesGroupPartyInternalID 103044 attribute is a PartyInternalID 103048 datatype. The CustomerQuoteSalesGroupPartyInternalID 103044 attribute has a cardinality of zero or one 103046 meaning that for each instance of the CustomerQuoteBasicDataSelectionByBuyerAndBasicData 103022 entity there may be one CustomerQuoteSalesGroupPartyInternalID 103044 attribute.

The CustomerQuoteProcessingTypeCode 103050 attribute is a BusinessTransactionDocumentProcessingTypeCode 103054 datatype. The CustomerQuoteProcessingTypeCode 103050 attribute has a cardinality of zero or one 103052 meaning that for each instance of the CustomerQuoteBasicDataSelectionByBuyerAndBasicData 103022 entity there may be one CustomerQuoteProcessingTypeCode 103050 attribute. The CustomerQuoteSalesTermsDistributionChannelCode 103056 attribute is a DistributionChannelCode 103060 datatype. The CustomerQuoteSalesTermsDistributionChannelCode 103056 attribute has a cardinality of zero or one 103058 meaning that for each instance of the CustomerQuoteBasicDataSelectionByBuyerAndBasicData 103022 entity there may be one CustomerQuoteSalesTermsDistributionChannelCode 103056 attribute. The CustomerQuoteSalesTermsDivisionCode 103062 attribute is a DivisionCode 103066 datatype. The CustomerQuoteSalesTermsDivisionCode 103062 attribute has a cardinality of zero or one 103064 meaning that for each instance of the CustomerQuoteBasicDataSelectionByBuyerAndBasicData 103022 entity there may be one CustomerQuoteSalesTermsDivisionCode 103062 attribute.

Selection Package

The selection package contains the attributes of CustomerQuotes

CustomerQuoteBasicDataSelectionByBuyerAndBasicData

CustomerQuoteBasicDataSelectionByBuyerAndBasicData specifies the criteria to select CustomerQuoteBasicData by Buyer and BasicData attributes. CustomerQuoteBuyerPartyInternalID is a proprietary identifier for a party. CustomerQuoteSalesOrganisationPartyInternalID is an identifier that is assigned by the SellerParty for the SalesOrganisationParty. CustomerQuoteSalesOfficePartyInternalID is a proprietary identifier for a party. CustomerQuoteSalesGroupPartyInternalID is a proprietary identifier for a party. CustomerQuoteProcessingTypeCode is a coded representation of a CustomerQuote within the Customer Quote Processing. CustomerQuoteSalesTermsDistributionChannelCode is a coded representation of a distribution channel via which the goods or services are made available to the customer. CustomerQuoteSalesTermsDivisionCode is a coded representation of a division that defines the responsibility for sales or profit for saleable materials or services.

Message Data Type

The message data type CustomerQuoteBasicDataByBuyerAndIncompletenessQueryMessage_sync contains the selection included in the business document. FIG. 105 shows a CustomerQuoteBasicDataByBuyerAndIncompletenessQueryMessage_sync 105000 package. The CustomerQuoteBasicDataByBuyerAndIncompletenessQueryMessage_sync 105000 package is a CustomerQuoteBasicDataByBuyerAndIncompletenessQueryMessage_sync 105004 datatype. The CustomerQuoteBasicDataByBuyerAndIncompletenessQueryMessage_sync 105000 package includes a CustomerQuoteBasicDataByBuyerAndIncompletenessQueryMessage_sync 105002 entity. The CustomerQuoteBasicDataByBuyerAndIncompletenessQueryMessage_sync 105000 package includes a Selection 105020 package. The Selection 105020 package includes a CustomerQuoteBasicDataSelectionByBuyerAndIncompleteness 105022 entity. The CustomerQuoteBasicDataSelectionByBuyerAndIncompleteness 105022 entity has a cardinality of one 105024 meaning that for each instance of the CustomerQuoteBasicDataByBuyerAndIncompletenessQueryMessage_sync 105002 entity there is one CustomerQuoteBasicDataSelectionByBuyerAndIncompleteness 105022 entity. The CustomerQuoteBasicDataSelectionByBuyerAndIncompleteness 105022 entity includes a CustomerQuoteBuyerPartyInternalID 105026 attribute. The CustomerQuoteBuyerPartyInternalID 105026 attribute is a PartyInternalID 105030 datatype. The CustomerQuoteBuyerPartyInternalID 105026 attribute has a cardinality of one 105028 meaning that for each instance of the CustomerQuoteBasicDataSelectionByBuyerAndIncompleteness 105022 entity there is one CustomerQuoteBuyerPartyInternalID 105026 attribute.

Selection Package

The selection package contains the attributes of CustomerQuotes

CustomerQuoteBasicDataSelectionByBuyerAndIncompleteness

CustomerQuoteBasicDataSelectionByBuyerAndIncompleteness specifies the criteria to select CustomerQuoteBasicData of incompleted CustomerQuotes by Buyer attributes. CustomerQuoteBuyerPartyInternalID is a proprietary identifier for a party.

Message Data Type

The message data type CustomerQuoteBasicDataByBuyerAndValidityPeriodQueryMessage_sync contains the selection included in the business document. FIGS. 107-1 through 107-2 show a CustomerQuoteBasicDataByBuyerAndValidityPeriodQueryMessage_sync 107000 package. The CustomerQuoteBasicDataByBuyerAndValidityPeriodQueryMessage_sync 107000 package is a CustomerQuoteBasicDataByBuyerAndValidityPeriodQueryMessage_sync 107004 datatype. The CustomerQuoteBasicDataByBuyerAndValidityPeriodQueryMessage_sync 107000 package includes a CustomerQuoteBasicDataByBuyerAndValidityPeriodQueryMessage_sync 107002 entity. The CustomerQuoteBasicDataByBuyerAndValidityPeriodQueryMessage_sync 107000 package includes a Selection 107020 package. The Selection 107020 package includes a CustomerQuoteBasicDataSelectionByBuyerAndValidityPeriod 107022 entity. The CustomerQuoteBasicDataSelectionByBuyerAndValidityPeriod 107022 entity has a cardinality of one 107024 meaning that for each instance of the CustomerQuoteBasicDataByBuyerAndValidityPeriodQueryMessage_sync 107002 entity there is one CustomerQuoteBasicDataSelectionByBuyerAndValidityPeriod 107022 entity. The CustomerQuoteBasicDataSelectionByBuyerAndValidityPeriod 107022 entity includes various attributes, namely CustomerQuoteBuyerPartyInternalID 107026, CustomerQuoteDateTermsValidityStartDate 107032 and CustomerQuoteDateTermsValidityEndDate 107038.

The CustomerQuoteBuyerPartyInternalID 107026 attribute is a PartyInternalID 107030 datatype. The CustomerQuoteBuyerPartyInternalID 107026 attribute has a cardinality of one 107028 meaning that for each instance of the CustomerQuoteBasicDataSelectionByBuyerAndValidityPeriod 107022 entity there is one CustomerQuoteBuyerPartyInternalID 107026 attribute. The CustomerQuoteDateTermsValidityStartDate 107032 attribute is a Date 107036 datatype. The CustomerQuoteDateTermsValidityStartDate 107032 attribute has a cardinality of one 107034 meaning that for each instance of the CustomerQuoteBasicDataSelectionByBuyerAndValidityPeriod 107022 entity there is one CustomerQuoteDateTermsValidityStartDate 107032 attribute. The CustomerQuoteDateTermsValidityEndDate 107038 attribute is a Date 107042 datatype. The CustomerQuoteDateTermsValidityEndDate 107038 attribute has a cardinality of one 107040 meaning that for each instance of the CustomerQuoteBasicDataSelectionByBuyerAndValidityPeriod 107022 entity there is one CustomerQuoteDateTermsValidityEndDate 107038 attribute.

Selection Package

The selection package contains the attributes of CustomerQuotes

CustomerQuoteBasicDataSelectionByBuyerAndValidityPeriod

CustomerQuoteBasicDataSelectionByBuyerAndValidityPeriod specifies the criteria to select CustomerQuoteBasicData by Buyer and validity period. CustomerQuoteBuyerPartyInternalID is a proprietary identifier for a party. CustomerQuoteDateTermsValidityStartDate. The ValidityStartDate is the specification of an exact day in the Gregorian calendar. It is the start date of the Customer Quote validity period. CustomerQuoteDateTermsValidityEndDate is the specification of an exact day in the Gregorian calendar. It is the end date of the Customer Quote validity period.

Message Data Type

FIGS. 102-1 through 102-4 show a CustomerQuoteBasicDataByBasicDataAndUserStatusResponseMessage_sync 102000 package. The CustomerQuoteBasicDataByBasicDataAndUserStatusResponseMessage_sync 102000 package is a CustomerQuoteBasicDataByBasicDataAndUserStatusResponseMessage_sync 102004 datatype. The CustomerQuoteBasicDataByBasicDataAndUserStatusResponseMessage_sync 102000 package includes a CustomerQuoteBasicDataByBasicDataAndUserStatusResponseMessage_sync 102002 entity. The CustomerQuoteBasicDataByBasicDataAndUserStatusResponseMessage_sync 102000 package includes various packages, namely CustomerQuote 102020 and Log 1020152.

The CustomerQuote 102020 package includes a CustomerQuote 102022 entity. The CustomerQuote 102020 package includes various packages, namely Party 102050, SalesTerms 102098, DateTerms 1020116 and TotalValues 1020140. The CustomerQuote 102022 entity has a cardinality of zero or n 102024 meaning that for each instance of the CustomerQuoteBasicDataByBasicDataAndUserStatusResponseMessage_sync 102002 entity there may be one or more CustomerQuote 102022 entities. The CustomerQuote 102022 entity includes various attributes, namely ID 102026, ProcessingTypeCode 102032, BuyerID 102038 and StatusObject 102044. The ID 102026 attribute is a CustomerQuoteID 102030 datatype. The ID 102026 attribute has a cardinality of one 102028 meaning that for each instance of the CustomerQuote 102022 entity there is one ID 102026 attribute.

The ProcessingTypeCode 102032 attribute is a BusinessTransactionDocumentProcessingTypeCode 102036 datatype. The ProcessingTypeCode 102032 attribute has a cardinality of zero or one 102034 meaning that for each instance of the CustomerQuote 102022 entity there may be one ProcessingTypeCode 102032 attribute. The BuyerID 102038 attribute is a BusinessTransactionDocumentID 102042 datatype. The BuyerID 102038 attribute has a cardinality of zero or one 102040 meaning that for each instance of the CustomerQuote 102022 entity there may be one BuyerID 102038 attribute. The StatusObject 102044 attribute is a StatusObject 102048 datatype. The StatusObject 102044 attribute has a cardinality of zero or one 102046 meaning that for each instance of the CustomerQuote 102022 entity there may be one StatusObject 102044 attribute. The Party 102050 package includes various entities, namely BuyerParty 102052, SalesOrganisationParty 102068, SalesOfficeParty 102078 and SalesGroupParty 102088.

The BuyerParty 102052 entity has a cardinality of one 102054 meaning that for each instance of the CustomerQuote 102022 entity there is one BuyerParty 102052 entity. The BuyerParty 102052 entity includes various attributes, namely InternalID 102056 and FormattedName 102062. The InternalID 102056 attribute is a PartyInternalID 102060 datatype. The InternalID 102056 attribute has a cardinality of one 102058 meaning that for each instance of the BuyerParty 102052 entity there is one InternalID 102056 attribute. The FormattedName 102062 attribute is a LONG_Name,Qualifier:PartyFormatted 102066 datatype. The FormattedName 102062 attribute has a cardinality of zero or one 102064 meaning that for each instance of the BuyerParty 102052 entity there may be one FormattedName 102062 attribute. The SalesOrganisationParty 102068 entity has a cardinality of one 102070 meaning that for each instance of the CustomerQuote 102022 entity there is one SalesOrganisationParty 102068 entity. The SalesOrganisationParty 102068 entity includes an InternalID 102072 attribute.

The InternalID 102072 attribute is a PartyInternalID 102076 datatype. The InternalID 102072 attribute has a cardinality of one 102074 meaning that for each instance of the SalesOrganisationParty 102068 entity there is one InternalID 102072 attribute. The SalesOfficeParty 102078 entity has a cardinality of zero or one 102080 meaning that for each instance of the CustomerQuote 102022 entity there may be one SalesOfficeParty 102078 entity. The SalesOfficeParty 102078 entity includes an InternalID 102082 attribute. The InternalID 102082 attribute is a PartyInternalID 102086 datatype. The InternalID 102082 attribute has a cardinality of one 102084 meaning that for each instance of the SalesOfficeParty 102078 entity there is one InternalID 102082 attribute. The SalesGroupParty 102088 entity has a cardinality of zero or one 102090 meaning that for each instance of the CustomerQuote 102022 entity there may be one SalesGroupParty 102088 entity. The SalesGroupParty 102088 entity includes an InternalID 102092 attribute. The InternalID 102092 attribute is a PartyInternalID 102096 datatype. The InternalID 102092 attribute has a cardinality of one 102094 meaning that for each instance of the SalesGroupParty 102088 entity there is one InternalID 102092 attribute. The SalesTerms 102098 package includes a SalesTerms 1020100 entity.

The SalesTerms 1020100 entity has a cardinality of zero or one 1020102 meaning that for each instance of the CustomerQuote 102022 entity there may be one SalesTerms 1020100 entity. The SalesTerms 1020100 entity includes various attributes, namely DistributionChannelCode 1020104 and DivisionCode 1020110. The DistributionChannelCode 1020104 attribute is a DistributionChannelCode 1020108 datatype. The DistributionChannelCode 1020104 attribute has a cardinality of zero or one 1020106 meaning that for each instance of the SalesTerms 1020100 entity there may be one DistributionChannelCode 1020104 attribute. The DivisionCode 1020110 attribute is a DivisionCode 1020114 datatype. The DivisionCode 1020110 attribute has a cardinality of zero or one 1020112 meaning that for each instance of the SalesTerms 1020100 entity there may be one DivisionCode 1020110 attribute. The DateTerms 1020116 package includes a DateTerms 1020118 entity.

The DateTerms 1020118 entity has a cardinality of zero or one 1020120 meaning that for each instance of the CustomerQuote 102022 entity there may be one DateTerms 1020118 entity. The DateTerms 1020118 entity includes various attributes, namely RequestDate 1020122, ValidityStartDate 1020128 and ValiditytEndDate 1020134. The RequestDate 1020122 attribute is a Date 1020126 datatype. The RequestDate 1020122 attribute has a cardinality of zero or one 1020124 meaning that for each instance of the DateTerms 1020118 entity there may be one RequestDate 1020122 attribute. The ValidityStartDate 1020128 attribute is a Date 1020132 datatype. The ValidityStartDate 1020128 attribute has a cardinality of zero or one 1020130 meaning that for each instance of the DateTerms 1020118 entity there may be one ValidityStartDate 1020128 attribute.

The ValiditytEndDate 1020134 attribute is a Date 1020138 datatype. The ValiditytEndDate 1020134 attribute has a cardinality of zero or one 1020136 meaning that for each instance of the DateTerms 1020118 entity there may be one ValiditytEndDate 1020134 attribute. The TotalValues 1020140 package includes a TotalValues 1020142 entity. The TotalValues 1020142 entity has a cardinality of zero or one 1020144 meaning that for each instance of the CustomerQuote 102022 entity there may be one TotalValues 1020142 entity. The TotalValues 1020142 entity includes a NetAmount 1020146 attribute. The NetAmount 1020146 attribute is an Amount 1020150 datatype. The NetAmount 1020146 attribute has a cardinality of zero or one 1020148 meaning that for each instance of the TotalValues 1020142 entity there may be one NetAmount 1020146 attribute. The Log 1020152 package is a Log 1020158 datatype. The Log 1020152 package includes a Log 1020154 entity. The Log 1020154 entity has a cardinality of one 1020156 meaning that for each instance of the CustomerQuoteBasicDataByBasicDataAndUserStatusResponseMessage_sync 102002 entity there is one Log 1020154 entity.

Message Data Type

FIGS. 104-1 through 104-5 show a CustomerQuoteBasicDataByBuyerAndBasicDataResponseMessage_sync 104000 package. The CustomerQuoteBasicDataByBuyerAndBasicDataResponseMessage_sync 104000 package is a CustomerQuoteBasicDataByBuyerAndBasicDataResponseMessage_sync 104004 datatype. The CustomerQuoteBasicDataByBuyerAndBasicDataResponseMessage_sync 104000 package includes a CustomerQuoteBasicDataByBuyerAndBasicDataResponseMessage_sync 104002 entity. The CustomerQuoteBasicDataByBuyerAndBasicDataResponseMessage_sync 104000 package includes various packages, namely CustomerQuote 104020 and Log 1040182. The CustomerQuote 104020 package includes a CustomerQuote 104022 entity. The CustomerQuote 104020 package includes various packages, namely Party 104050, SalesTerms 1040116, DateTerms 1040146 and TotalValues 1040170. The CustomerQuote 104022 entity has a cardinality of zero or n 104024 meaning that for each instance of the CustomerQuoteBasicDataByBuyerAndBasicDataResponseMessage_sync 104002 entity there may be one or more CustomerQuote 104022 entities. The CustomerQuote 104022 entity includes various attributes, namely ID 104026, ProcessingTypeCode 104032, ProcessingTypeName 104038 and BuyerID 104044. The ID 104026 attribute is a CustomerQuoteID 104030 datatype. The ID 104026 attribute has a cardinality of one 104028 meaning that for each instance of the CustomerQuote 104022 entity there is one ID 104026 attribute. The ProcessingTypeCode 104032 attribute is a BusinessTransactionDocumentProcessingTypeCode 104036 datatype. The ProcessingTypeCode 104032 attribute has a cardinality of zero or one 104034 meaning that for each instance of the CustomerQuote 104022 entity there may be one ProcessingTypeCode 104032 attribute.

The ProcessingTypeName 104038 attribute is a MEDIUM_Name,Qualifier:ProcessingType 104042 datatype. The ProcessingTypeName 104038 attribute has a cardinality of zero or one 104040 meaning that for each instance of the CustomerQuote 104022 entity there may be one ProcessingTypeName 104038 attribute. The BuyerID 104044 attribute is a BusinessTransactionDocumentID 104048 datatype. The BuyerID 104044 attribute has a cardinality of zero or one 104046 meaning that for each instance of the CustomerQuote 104022 entity there may be one BuyerID 104044 attribute. The Party 104050 package includes various entities, namely BuyerParty 104052, SalesOrganisationParty 104068, SalesOfficeParty 104084 and SalesGroupParty 1040100. The BuyerParty 104052 entity has a cardinality of one 104054 meaning that for each instance of the CustomerQuote 104022 entity there is one BuyerParty 104052 entity. The BuyerParty 104052 entity includes various attributes, namely InternalID 104056 and FormattedName 104062. The InternalID 104056 attribute is a PartyInternalID 104060 datatype. The InternalID 104056 attribute has a cardinality of one 104058 meaning that for each instance of the BuyerParty 104052 entity there is one InternalID 104056 attribute. The FormattedName 104062 attribute is a LONG_Name,Qualifier:PartyFormatted 104066 datatype. The FormattedName 104062 attribute has a cardinality of zero or one 104064 meaning that for each instance of the BuyerParty 104052 entity there may be one FormattedName 104062 attribute.

The SalesOrganisationParty 104068 entity has a cardinality of one 104070 meaning that for each instance of the CustomerQuote 104022 entity there is one SalesOrganisationParty 104068 entity. The SalesOrganisationParty 104068 entity includes various attributes, namely InternalID 104072 and FormattedName 104078. The InternalID 104072 attribute is a PartyInternalID 104076 datatype. The InternalID 104072 attribute has a cardinality of one 104074 meaning that for each instance of the SalesOrganisationParty 104068 entity there is one InternalID 104072 attribute. The FormattedName 104078 attribute is a LONG_Name,Qualifier:PartyFormatted 104082 datatype. The FormattedName 104078 attribute has a cardinality of zero or one 104080 meaning that for each instance of the SalesOrganisationParty 104068 entity there may be one FormattedName 104078 attribute. The SalesOfficeParty 104084 entity has a cardinality of zero or one 104086 meaning that for each instance of the CustomerQuote 104022 entity there may be one SalesOfficeParty 104084 entity. The SalesOfficeParty 104084 entity includes various attributes, namely InternalID 104088 and FormattedName 104094. The InternalID 104088 attribute is a PartyInternalID 104092 datatype. The InternalID 104088 attribute has a cardinality of one 104090 meaning that for each instance of the SalesOfficeParty 104084 entity there is one InternalID 104088 attribute. The FormattedName 104094 attribute is a LONG_Name,Qualifier:PartyFormatted 104098 datatype. The FormattedName 104094 attribute has a cardinality of zero or one 104096 meaning that for each instance of the SalesOfficeParty 104084 entity there may be one FormattedName 104094 attribute.

The SalesGroupParty 1040100 entity has a cardinality of zero or one 1040102 meaning that for each instance of the CustomerQuote 104022 entity there may be one SalesGroupParty 1040100 entity. The SalesGroupParty 1040100 entity includes various attributes, namely InternalID 1040104 and FormattedName 1040110. The InternalID 1040104 attribute is a PartyInternalID 1040108 datatype. The InternalID 1040104 attribute has a cardinality of one 1040106 meaning that for each instance of the SalesGroupParty 1040100 entity there is one InternalID 1040104 attribute. The FormattedName 1040110 attribute is a LONG_Name,Qualifier:PartyFormatted 1040114 datatype. The FormattedName 1040110 attribute has a cardinality of zero or one 1040112 meaning that for each instance of the SalesGroupParty 1040100 entity there may be one FormattedName 1040110 attribute. The SalesTerms 1040116 package includes a SalesTerms 1040118 entity. The SalesTerms 1040118 entity has a cardinality of zero or one 1040120 meaning that for each instance of the CustomerQuote 104022 entity there may be one SalesTerms 1040118 entity. The SalesTerms 1040118 entity includes various attributes, namely DistributionChannelCode 1040122, DistributionChannelName 1040128, DivisionCode 1040134 and DivisionName 1040140.

The DistributionChannelCode 1040122 attribute is a DistributionChannelCode 1040126 datatype. The DistributionChannelCode 1040122 attribute has a cardinality of zero or one 1040124 meaning that for each instance of the SalesTerms 1040118 entity there may be one DistributionChannelCode 1040122 attribute. The DistributionChannelName 1040128 attribute is a MEDIUM_Name,Qualifier:DistributionChannel 1040132 datatype. The DistributionChannelName 1040128 attribute has a cardinality of zero or one 1040130 meaning that for each instance of the SalesTerms 1040118 entity there may be one DistributionChannelName 1040128 attribute. The DivisionCode 1040134 attribute is a DivisionCode 1040138 datatype. The DivisionCode 1040134 attribute has a cardinality of zero or one 1040136 meaning that for each instance of the SalesTerms 1040118 entity there may be one DivisionCode 1040134 attribute. The DivisionName 1040140 attribute is a MEDIUM_Name,Qualifier:Division 1040144 datatype. The DivisionName 1040140 attribute has a cardinality of zero or one 1040142 meaning that for each instance of the SalesTerms 1040118 entity there may be one DivisionName 1040140 attribute.

The DateTerms 1040146 package includes a DateTerms 1040148 entity. The DateTerms 1040148 entity has a cardinality of zero or one 1040150 meaning that for each instance of the CustomerQuote 104022 entity there may be one DateTerms 1040148 entity. The DateTerms 1040148 entity includes various attributes, namely RequestDate 1040152, ValidityStartDate 1040158 and ValiditytEndDate 1040164. The RequestDate 1040152 attribute is a Date 1040156 datatype. The RequestDate 1040152 attribute has a cardinality of zero or one 1040154 meaning that for each instance of the DateTerms 1040148 entity there may be one RequestDate 1040152 attribute. The ValidityStartDate 1040158 attribute is a Date 1040162 datatype. The ValidityStartDate 1040158 attribute has a cardinality of one 1040160 meaning that for each instance of the DateTerms 1040148 entity there is one ValidityStartDate 1040158 attribute.

The ValiditytEndDate 1040164 attribute is a Date 1040168 datatype. The ValiditytEndDate 1040164 attribute has a cardinality of one 1040166 meaning that for each instance of the DateTerms 1040148 entity there is one ValiditytEndDate 1040164 attribute. The TotalValues 1040170 package includes a TotalValues 1040172 entity.

The TotalValues 1040172 entity has a cardinality of zero or one 1040174 meaning that for each instance of the CustomerQuote 104022 entity there may be one TotalValues 1040172 entity. The TotalValues 1040172 entity includes a NetAmount 1040176 attribute. The NetAmount 1040176 attribute is an Amount 1040180 datatype. The NetAmount 1040176 attribute has a cardinality of zero or one 1040178 meaning that for each instance of the TotalValues 1040172 entity there may be one NetAmount 1040176 attribute. The Log 1040182 package is a Log 1040188 datatype. The Log 1040182 package includes a Log 1040184 entity. The Log 1040184 entity has a cardinality of one 1040186 meaning that for each instance of the CustomerQuoteBasicDataByBuyerAndBasicDataResponseMessage_sync 104002 entity there is one Log 1040184 entity.

Message Data Type

FIGS. 106-1 through 106-5 show a CustomerQuoteBasicDataByBuyerAndIncompletenessResponseMessage_sync 106000 package. The CustomerQuoteBasicDataByBuyerAndIncompletenessResponseMessage_sync 106000 package is a CustomerQuoteBasicDataByBuyerAndIncompletenessResponseMessage_sync 106004 datatype. The CustomerQuoteBasicDataByBuyerAndIncompletenessResponseMessage_sync 106000 package includes a CustomerQuoteBasicDataByBuyerAndIncompletenessResponseMessage_sync 106002 entity. The CustomerQuoteBasicDataByBuyerAndIncompletenessResponseMessage_sync 106000 package includes various packages, namely CustomerQuote 106020 and Log 1060182.

The CustomerQuote 106020 package includes a CustomerQuote 106022 entity. The CustomerQuote 106020 package includes various packages, namely Party 106050, SalesTerms 1060116, DateTerms 1060146 and TotalValues 1060170. The CustomerQuote 106022 entity has a cardinality of zero or n 106024 meaning that for each instance of the CustomerQuoteBasicDataByBuyerAndIncompletenessResponseMessage_sync 106002 entity there may be one or more CustomerQuote 106022 entities. The CustomerQuote 106022 entity includes various attributes, namely ID 106026, ProcessingTypeCode 106032, ProcessingTypeName 106038 and BuyerID 106044. The ID 106026 attribute is a CustomerQuoteID 106030 datatype. The ID 106026 attribute has a cardinality of one 106028 meaning that for each instance of the CustomerQuote 106022 entity there is one ID 106026 attribute. The ProcessingTypeCode 106032 attribute is a BusinessTransactionDocumentProcessingTypeCode 106036 datatype. The ProcessingTypeCode 106032 attribute has a cardinality of zero or one 106034 meaning that for each instance of the CustomerQuote 106022 entity there may be one ProcessingTypeCode 106032 attribute. The ProcessingTypeName 106038 attribute is a MEDIUM_Name,Qualifier:ProcessingType 106042 datatype. The ProcessingTypeName 106038 attribute has a cardinality of zero or one 106040 meaning that for each instance of the CustomerQuote 106022 entity there may be one ProcessingTypeName 106038 attribute.

The BuyerID 106044 attribute is a BusinessTransactionDocumentID 106048 datatype. The BuyerID 106044 attribute has a cardinality of zero or one 106046 meaning that for each instance of the CustomerQuote 106022 entity there may be one BuyerID 106044 attribute. The Party 106050 package includes various entities, namely BuyerParty 106052, SalesOrganisationParty 106068, SalesOfficeParty 106084 and SalesGroupParty 1060100. The BuyerParty 106052 entity has a cardinality of one 106054 meaning that for each instance of the CustomerQuote 106022 entity there is one BuyerParty 106052 entity. The BuyerParty 106052 entity includes various attributes, namely InternalID 106056 and FormattedName 106062.

The InternalID 106056 attribute is a PartyInternalID 106060 datatype. The InternalID 106056 attribute has a cardinality of one 106058 meaning that for each instance of the BuyerParty 106052 entity there is one InternalID 106056 attribute.

The FormattedName 106062 attribute is a LONG_Name, Qualifier:PartyFormatted 106066 datatype. The FormattedName 106062 attribute has a cardinality of zero or one 106064 meaning that for each instance of the BuyerParty 106052 entity there may be one FormattedName 106062 attribute.

The SalesOrganisationParty 106068 entity has a cardinality of one 106070 meaning that for each instance of the CustomerQuote 106022 entity there is one SalesOrganisationParty 106068 entity. The SalesOrganisationParty 106068 entity includes various attributes, namely InternalID 106072 and FormattedName 106078.

The InternalID 106072 attribute is a PartyInternalID 106076 datatype. The InternalID 106072 attribute has a cardinality of one 106074 meaning that for each instance of the SalesOrganisationParty 106068 entity there is one InternalID 106072 attribute.

The FormattedName 106078 attribute is a LONG_Name, Qualifier:PartyFormatted 106082 datatype. The FormattedName 106078 attribute has a cardinality of zero or one 106080 meaning that for each instance of the SalesOrganisationParty 106068 entity there may be one FormattedName 106078 attribute.

The SalesOfficeParty 106084 entity has a cardinality of zero or one 106086 meaning that for each instance of the CustomerQuote 106022 entity there may be one SalesOfficeParty 106084 entity. The SalesOfficeParty 106084 entity includes various attributes, namely InternalID 106088 and FormattedName 106094.

The InternalID 106088 attribute is a PartyInternalID 106092 datatype. The InternalID 106088 attribute has a cardinality of one 106090 meaning that for each instance of the SalesOfficeParty 106084 entity there is one InternalID 106088 attribute.

The FormattedName 106094 attribute is a LONG_Name, Qualifier:PartyFormatted 106098 datatype. The FormattedName 106094 attribute has a cardinality of zero or one 106096 meaning that for each instance of the SalesOfficeParty 106084 entity there may be one FormattedName 106094 attribute.

The SalesGroupParty 1060100 entity has a cardinality of zero or one 1060102 meaning that for each instance of the CustomerQuote 106022 entity there may be one SalesGroupParty 1060100 entity. The SalesGroupParty 1060100 entity includes various attributes, namely InternalID 1060104 and FormattedName 1060110.

The InternalID 1060104 attribute is a PartyInternalID 1060108 datatype. The InternalID 1060104 attribute has a cardinality of one 1060106 meaning that for each instance of the SalesGroupParty 1060100 entity there is one InternalID 1060104 attribute.

The FormattedName 1060110 attribute is a LONG_Name, Qualifier:PartyFormatted 1060114 datatype. The FormattedName 1060110 attribute has a cardinality of zero or one 1060112 meaning that for each instance of the SalesGroupParty 1060100 entity there may be one FormattedName 1060110 attribute.

The SalesTerms 1060116 package includes a SalesTerms 1060118 entity. The SalesTerms 1060118 entity has a cardinality of zero or one 1060120 meaning that for each instance of the CustomerQuote 106022 entity there may be one SalesTerms 1060118 entity. The SalesTerms 1060118 entity includes various attributes, namely DistributionChannelCode 1060122, DistributionChannelName 1060128, DivisionCode 1060134 and DivisionName 1060140.

The DistributionChannelCode 1060122 attribute is a DistributionChannelCode 1060126 datatype. The DistributionChannelCode 1060122 attribute has a cardinality of zero or one 1060124 meaning that for each instance of the SalesTerms 1060118 entity there may be one DistributionChannelCode 1060122 attribute.

The DistributionChannelName 1060128 attribute is a MEDIUM_Name,Qualifier:DistributionChannel 1060132 datatype. The DistributionChannelName 1060128 attribute has a cardinality of zero or one 1060130 meaning that for each instance of the SalesTerms 1060118 entity there may be one DistributionChannelName 1060128 attribute.

The DivisionCode 1060134 attribute is a DivisionCode 1060138 datatype. The DivisionCode 1060134 attribute has a cardinality of zero or one 1060136 meaning that for each instance of the SalesTerms 1060118 entity there may be one DivisionCode 1060134 attribute.

The DivisionName 1060140 attribute is a MEDIUM_Name,Qualifier:Division 1060144 datatype. The DivisionName 1060140 attribute has a cardinality of zero or one 1060142 meaning that for each instance of the SalesTerms 1060118 entity there may be one DivisionName 1060140 attribute.

The DateTerms 1060146 package includes a DateTerms 1060148 entity. The DateTerms 1060148 entity has a cardinality of zero or one 1060150 meaning that for each instance of the CustomerQuote 106022 entity there may be one DateTerms 1060148 entity. The DateTerms 1060148 entity includes various attributes, namely RequestDate 1060152, ValidityStartDate 1060158 and ValiditytEndDate 1060164.

The RequestDate 1060152 attribute is a Date 1060156 datatype. The RequestDate 1060152 attribute has a cardinality of zero or one 1060154 meaning that for each instance of the DateTerms 1060148 entity there may be one RequestDate 1060152 attribute.

The ValidityStartDate 1060158 attribute is a Date 1060162 datatype. The ValidityStartDate 1060158 attribute has a cardinality of one 1060160 meaning that for each instance of the DateTerms 1060148 entity there is one ValidityStartDate 1060158 attribute.

The ValiditytEndDate 1060164 attribute is a Date 1060168 datatype. The ValiditytEndDate 1060164 attribute has a cardinality of one 1060166 meaning that for each instance of the DateTerms 1060148 entity there is one ValiditytEndDate 1060164 attribute. The TotalValues 1060170 package includes a TotalValues 1060172 entity. The TotalValues 1060172 1060176 attribute.

The NetAmount 1060176 attribute is an Amount 1060180 datatype. The NetAmount 1060176 attribute has a cardinality of zero or one 1060178 meaning that for each instance of the TotalValues 1060172 entity there may be one NetAmount 1060176 attribute.

The Log 1060182 package is a Log 1060188 datatype. The Log 1060182 package includes a Log 1060184 entity. The Log 1060184 entity has a cardinality of one 1060186 meaning that for each instance of the CustomerQuoteBasicDataByBuyerAndIncompletenessResponseMessage_sync 106002 entity there is one Log 1060184 entity.

Message Data Type

FIGS. 108-1 through 108-5 show a CustomerQuoteBasicDataByBuyerAndValidityPeriodResponseMessage_sync 108000 package. The CustomerQuoteBasicDataByBuyerAndValidityPeriodResponseMessage_sync 108000 package is a CustomerQuoteBasicDataByBuyerAndValidityPeriodResponseMessage_sync 108004 datatype. The CustomerQuoteBasicDataByBuyerAndValidityPeriodResponseMessage_sync 108000 package includes a CustomerQuoteBasicDataByBuyerAndValidityPeriodResponseMessage_sync 108002 entity. The CustomerQuoteBasicDataByBuyerAndValidityPeriodResponseMessage_sync 108000 package includes various packages, namely CustomerQuote 108020 and Log 1080182.

The CustomerQuote 108020 package includes a CustomerQuote 108022 entity. The CustomerQuote 108020 package includes various packages, namely Party 108050, SalesTerms 1080116, DateTerms 1080146 and TotalValues 1080170.

The CustomerQuote 108022 entity has a cardinality of zero or n 108024 meaning that for each instance of the CustomerQuoteBasicDataByBuyerAndValidityPeriodResponseMessage_sync 108002 entity there may be one or more CustomerQuote 108022 entities. The CustomerQuote 108022 entity includes various attributes, namely ID 108026, ProcessingTypeCode 108032, ProcessingTypeName 108038 and BuyerID 108044.

The ID 108026 attribute is a CustomerQuoteID 108030 datatype. The ID 108026 attribute has a cardinality of one 108028 meaning that for each instance of the CustomerQuote 108022 entity there is one ID 108026 attribute.

The ProcessingTypeCode 108032 attribute is a BusinessTransactionDocumentProcessingTypeCode 108036 datatype. The ProcessingTypeCode 108032 attribute has a cardinality of zero or one 108034 meaning that for each instance of the CustomerQuote 108022 entity there may be one ProcessingTypeCode 108032 attribute.

The ProcessingTypeName 108038 attribute is a MEDIUM_Name,Qualifier:ProcessingType 108042 datatype. The ProcessingTypeName 108038 attribute has a cardinality of zero or one 108040 meaning that for each instance of the CustomerQuote 108022 entity there may be one ProcessingTypeName 108038 attribute.

The BuyerID 108044 attribute is a BusinessTransactionDocumentID 108048 datatype. The BuyerID 108044 attribute has a cardinality of zero or one 108046 meaning that for each instance of the CustomerQuote 108022 entity there may be one BuyerID 108044 attribute. The Party 108050 package includes various entities, namely BuyerParty 108052, SalesOrganisationParty 108068, SalesOfficeParty 108084 and SalesGroupParty 1080100. The BuyerParty 108052 entity has a cardinality of one 108054 meaning that for each instance of the CustomerQuote 108022 entity there is one BuyerParty 108052 entity. The BuyerParty 108052 entity includes various attributes, namely InternalID 108056 and FormattedName 108062. The InternalID 108056 attribute is a PartyInternalID 108060 datatype. The InternalID 108056 attribute has a cardinality of one 108058 meaning that for each instance of the BuyerParty 108052 entity there is one InternalID 108056 attribute. The FormattedName 108062 attribute is a LONG_Name,Qualifier:PartyFormatted 108066 datatype. The FormattedName 108062 attribute has a cardinality of zero or one 108064 meaning that for each instance of the BuyerParty 108052 entity there may be one FormattedName 108062 attribute.

The SalesOrganisationParty 108068 entity has a cardinality of one 108070 meaning that for each instance of the CustomerQuote 108022 entity there is one SalesOrganisationParty 108068 entity. The SalesOrganisationParty 108068 entity includes various attributes, namely InternalID 108072 and FormattedName 108078.

The InternalID 108072 attribute is a PartyInternalID 108076 datatype. The InternalID 108072 attribute has a cardinality of one 108074 meaning that for each instance of the SalesOrganisationParty 108068 entity there is one InternalID 108072 attribute. The FormattedName 108078 attribute is a LONG_Name,Qualifier:PartyFormatted 108082 datatype. The FormattedName 108078 attribute has a cardinality of zero or one 108080 meaning that for each instance of the SalesOrganisationParty 108068 entity there may be one FormattedName 108078 attribute. The SalesOfficeParty 108084 entity has a cardinality of zero or one 108086 meaning that for each instance of the CustomerQuote 108022 entity there may be one SalesOfficeParty 108084 entity. The SalesOfficeParty 108084 entity includes various attributes, namely InternalID 108088 and FormattedName 108094.

The InternalID 108088 attribute is a PartyInternalID 108092 datatype. The InternalID 108088 attribute has a cardinality of one 108090 meaning that for each instance of the SalesOfficeParty 108084 entity there is one InternalID 108088 attribute. The FormattedName 108094 attribute is a LONG_Name,Qualifier:PartyFormatted 108098 datatype. The FormattedName 108094 attribute has a cardinality of zero or one 108096 meaning that for each instance of the SalesOfficeParty 108084 entity there may be one FormattedName 108094 attribute. The SalesGroupParty 1080100 entity has a cardinality of zero or one 1080102 meaning that for each instance of the CustomerQuote 108022 entity there may be one SalesGroupParty 1080100 entity. The SalesGroupParty 1080100 entity includes various attributes, namely InternalID 1080104 and FormattedName 1080110.

The InternalID 1080104 attribute is a PartyInternalID 1080108 datatype. The InternalID 1080104 attribute has a cardinality of one 1080106 meaning that for each instance of the SalesGroupParty 1080100 entity there is one InternalID 1080104 attribute. The FormattedName 1080110 attribute is a LONG_Name,Qualifier:PartyFormatted 1080114 datatype. The FormattedName 1080110 attribute has a cardinality of zero or one 1080112 meaning that for each instance of the SalesGroupParty 1080100 entity there may be one FormattedName 1080110 attribute. The SalesTerms 1080116 package includes a SalesTerms 1080118 entity. The SalesTerms 1080118 entity has a cardinality of zero or one 1080120 meaning that for each instance of the CustomerQuote 108022 entity there may be one SalesTerms 1080118 entity. The SalesTerms 1080118 entity includes various attributes, namely DistributionChannelCode 1080122, DistributionChannelName 1080128, DivisionCode 1080134 and DivisionName 1080140.

The DistributionChannelCode 1080122 attribute is a DistributionChannelCode 1080126 datatype. The DistributionChannelCode 1080122 attribute has a cardinality of zero or one 1080124 meaning that for each instance of the SalesTerms 1080118 entity there may be one DistributionChannelCode 1080122 attribute. The DistributionChannelName 1080128 attribute is a MEDIUM_Name,Qualifier:DistributionChannel 1080132 datatype. The DistributionChannelName 1080128 attribute has a cardinality of zero or one 1080130 meaning that for each instance of the SalesTerms 1080118 entity there may be one DistributionChannelName 1080128 attribute. The DivisionCode 1080134 attribute is a DivisionCode 1080138 datatype. The DivisionCode 1080134 attribute has a cardinality of zero or one 1080136 meaning that for each instance of the SalesTerms 1080118 entity there may be one DivisionCode 1080134 attribute.

The DivisionName 1080140 attribute is a MEDIUM_Name,Qualifier:Division 1080144 datatype. The DivisionName 1080140 attribute has a cardinality of zero or one 1080142 meaning that for each instance of the SalesTerms 1080118 entity there may be one DivisionName 1080140 attribute. The DateTerms 1080146 package includes a DateTerms 1080148 entity. The DateTerms 1080148 entity has a cardinality of zero or one 1080150 meaning that for each instance of the CustomerQuote 108022 entity there may be one DateTerms 1080148 entity. The DateTerms 1080148 entity includes various attributes, namely RequestDate 1080152, ValidityStartDate 1080158 and ValiditytEndDate 1080164. The RequestDate 1080152 attribute is a Date 1080156 datatype. The RequestDate 1080152 attribute has a cardinality of zero or one 1080154 meaning that for each instance of the DateTerms 1080148 entity there may be one RequestDate 1080152 attribute. The ValidityStartDate 1080158 attribute is a Date 1080162 datatype. The ValidityStartDate 1080158 attribute has a cardinality of one 1080160 meaning that for each instance of the DateTerms 1080148 entity there is one ValidityStartDate 1080158 attribute.

The ValiditytEndDate 1080164 attribute is a Date 1080168 datatype. The ValiditytEndDate 1080164 attribute has a cardinality of one 1080166 meaning that for each instance of the DateTerms 1080148 entity there is one ValiditytEndDate 1080164 attribute. The TotalValues 1080170 package includes a TotalValues 1080172 entity.

The TotalValues 1080172 entity has a cardinality of zero or one 1080174 meaning that for each instance of the CustomerQuote 108022 entity there may be one TotalValues 1080172 entity. The TotalValues 1080172 entity includes a NetAmount 1080176 attribute. The NetAmount 1080176 attribute is an Amount 1080180 datatype. The NetAmount 1080176 attribute has a cardinality of zero or one 1080178 meaning that for each instance of the TotalValues 1080172 entity there may be one NetAmount 1080176 attribute. The Log 1080182 package is a Log 1080188 datatype. The Log 1080182 package includes a Log 1080184 entity. The Log 1080184 entity has a cardinality of one 1080186 meaning that for each instance of the CustomerQuoteBasicDataByBuyerAndValidityPeriodResponseMessage_sync 108002 entity there is one Log 1080184 entity.

Message Data Type

FIGS. 110-1 through 110-12 show a CustomerQuoteByIDResponseMessage_sync 110000 package. The CustomerQuoteByIDResponseMessage_sync 110000 package is a CustomerQuoteByIDResponseMessage_sync 110004 datatype. The CustomerQuoteByIDResponseMessage_sync 110000 package includes a CustomerQuoteByIDResponseMessage_sync 110002 entity. The CustomerQuoteByIDResponseMessage_sync 110000 package includes various packages, namely CustomerQuote 110020 and Log 1100466.

The CustomerQuote 110020 package includes a CustomerQuote 110022 entity. The CustomerQuote 110020 package includes various packages, namely Party 110056, SalesTerms 1100168, DateTerms 1100186, PricingTerms 1100210, DeliveryTerms 1100228, InvoiceTerms 1100240, TotalValues 1100252 and Item 1100270.

The CustomerQuote 110022 entity has a cardinality of zero or one 110024 meaning that for each instance of the CustomerQuoteByIDResponseMessage_sync 110002 entity there may be one CustomerQuote 110022 entity. The CustomerQuote 110022 entity includes various attributes, namely ID 110026, Date 110032, ProcessingTypeCode 110038, BuyerID 110044 and StatusObject 110050.

The ID 110026 attribute is a CustomerQuoteID 110030 datatype. The ID 110026 attribute has a cardinality of one 110028 meaning that for each instance of the CustomerQuote 110022 entity there is one ID 110026 attribute.

The Date 110032 attribute is a Date 110036 datatype. The Date 110032 attribute has a cardinality of zero or one 110034 meaning that for each instance of the CustomerQuote 110022 entity there may be one Date 110032 attribute.

The ProcessingTypeCode 110038 attribute is a BusinessTransactionDocumentProcessingTypeCode 110042 datatype. The ProcessingTypeCode 110038 attribute has a cardinality of zero or one 110040 meaning that for each instance of the CustomerQuote 110022 entity there may be one ProcessingTypeCode 110038 attribute.

The BuyerID 110044 attribute is a BusinessTransactionDocumentID 110048 datatype. The BuyerID 110044 attribute has a cardinality of zero or one 110046 meaning that for each instance of the CustomerQuote 110022 entity there may be one BuyerID 110044 attribute.

The StatusObject 110050 attribute is a StatusObject 110054 datatype. The StatusObject 110050 attribute has a cardinality of zero or one 110052 meaning that for each instance of the CustomerQuote 110022 entity there may be one StatusObject 110050 attribute.

The Party 110056 package includes various entities, namely BuyerParty 110058, GoodsRecipientParty 110074, BillToParty 110090, PayerParty 1100106, ResponsibleEmployeeParty 1100122, SalesOrganisationParty 1100138, SalesOfficeParty 1100148 and SalesGroupParty 1100158.

The BuyerParty 110058 entity has a cardinality of one 110060 meaning that for each instance of the CustomerQuote 110022 entity there is one BuyerParty 110058 entity. The BuyerParty 110058 entity includes various attributes, namely InternalID 110062 and FormattedName 110068.

The InternalID 110062 attribute is a PartyInternalID 110066 datatype. The InternalID 110062 attribute has a cardinality of one 110064 meaning that for each instance of the BuyerParty 110058 entity there is one InternalID 110062 attribute.

The FormattedName 110068 attribute is a LONG_Name, Qualifier:PartyFormatted 110072 datatype. The FormattedName 110068 attribute has a cardinality of zero or one 110070 meaning that for each instance of the BuyerParty 110058 entity there may be one FormattedName 110068 attribute.

The GoodsRecipientParty 110074 entity has a cardinality of zero or one 110076 meaning that for each instance of the CustomerQuote 110022 entity there may be one GoodsRecipientParty 110074 entity. The GoodsRecipientParty 110074 entity includes various attributes, namely InternalID 110078 and FormattedName 110084.

The InternalID 110078 attribute is a PartyInternalID 110082 datatype. The InternalID 110078 attribute has a cardinality of one 110080 meaning that for each instance of the GoodsRecipientParty 110074 entity there is one InternalID 110078 attribute.

The FormattedName 110084 attribute is a LONG_Name, Qualifier:PartyFormatted 110088 datatype. The FormattedName 110084 attribute has a cardinality of zero or one 110086 meaning that for each instance of the GoodsRecipientParty 110074 entity there may be one FormattedName 110084 attribute.

The BillToParty 110090 entity has a cardinality of zero or one 110092 meaning that for each instance of the CustomerQuote 110022 entity there may be one BillToParty 110090 entity. The BillToParty 110090 entity includes various attributes, namely InternalID 110094 and FormattedName 1100100.

The InternalID 110094 attribute is a PartyInternalID 110098 datatype. The InternalID 110094 attribute has a cardinality of one 110096 meaning that for each instance of the BillToParty 110090 entity there is one InternalID 110094 attribute.

The FormattedName 1100100 attribute is a LONG_Name, Qualifier:PartyFormatted 1100104 datatype. The FormattedName 1100100 attribute has a cardinality of zero or one 1100102 meaning that for each instance of the BillToParty 110090 entity there may be one FormattedName 1100100 attribute.

The PayerParty 1100106 entity has a cardinality of zero or one 1100108 meaning that for each instance of the CustomerQuote 110022 entity there may be one PayerParty 1100106 entity. The PayerParty 1100106 entity includes various attributes, namely InternalID 1100110 and FormattedName 1100116.

The InternalID 1100110 attribute is a PartyInternalID 1100114 datatype. The InternalID 1100110 attribute has a cardinality of one 1100112 meaning that for each instance of the PayerParty 1100106 entity there is one InternalID 1100110 attribute.

The FormattedName 1100116 attribute is a LONG_Name, Qualifier:PartyFormatted 1100120 datatype. The FormattedName 1100116 attribute has a cardinality of zero or one 1100118 meaning that for each instance of the PayerParty 1100106 entity there may be one FormattedName 1100116 attribute.

The ResponsibleEmployeeParty 1100122 entity has a cardinality of zero or one 1100124 meaning that for each instance of the CustomerQuote 110022 entity there may be one ResponsibleEmployeeParty 1100122 entity. The ResponsibleEmployeeParty 1100122 entity includes various attributes, namely InternalID 1100126 and FormattedName 1100132.

The InternalID 1100126 attribute is a PartyInternalID 1100130 datatype. The InternalID 1100126 attribute has a cardinality of one 1100128 meaning that for each instance of the ResponsibleEmployeeParty 1100122 entity there is one InternalID 1100126 attribute.

The FormattedName 1100132 attribute is a LANGUAGEINDEPENDENT_LONG_Name,Qualifier:PersonFormatted 1100136 datatype. The FormattedName 1100132 attribute has a cardinality of zero or one 1100134 meaning that for each instance of the ResponsibleEmployeeParty 1100122 entity there may be one FormattedName 1100132 attribute.

The SalesOrganisationParty 1100138 entity has a cardinality of one 1100140 meaning that for each instance of the CustomerQuote 110022 entity there is one SalesOrganisationParty 1100138 entity. The SalesOrganisationParty 1100138 entity includes an InternalID 1100142 attribute.

The InternalID 1100142 attribute is a PartyInternalID 1100146 datatype. The InternalID 1100142 attribute has a cardinality of one 1100144 meaning that for each instance of the SalesOrganisationParty 1100138 entity there is one InternalID 1100142 attribute.

The SalesOfficeParty 1100148 entity has a cardinality of zero or one 1100150 meaning that for each instance of the CustomerQuote 110022 entity there may be one SalesOfficeParty 1100148 entity. The SalesOfficeParty 1100148 entity includes an InternalID 1100152 attribute.

The InternalID 1100152 attribute is a PartyInternalID 1100156 datatype. The InternalID 1100152 attribute has a cardinality of one 1100154 meaning that for each instance of the SalesOfficeParty 1100148 entity there is one InternalID 1100152 attribute.

The SalesGroupParty 1100158 entity has a cardinality of zero or one 1100160 meaning that for each instance of the CustomerQuote 110022 entity there may be one SalesGroupParty 1100158 entity. The SalesGroupParty 1100158 entity includes an InternalID 1100162 attribute.

The InternalID 1100162 attribute is a PartyInternalID 1100166 datatype. The InternalID 1100162 attribute has a cardinality of one 1100164 meaning that for each instance of the SalesGroupParty 1100158 entity there is one InternalID 1100162 attribute.

The SalesTerms 1100168 package includes a SalesTerms 1100170 entity. The SalesTerms 1100170 entity has a cardinality of zero or one 1100172 meaning that for each instance of the CustomerQuote 110022 entity there may be one SalesTerms 1100170 entity. The SalesTerms 1100170 entity includes various attributes, namely DistributionChannelCode 1100174 and DivisionCode 1100180.

The DistributionChannelCode 1100174 attribute is a DistributionChannelCode 1100178 datatype. The DistributionChannelCode 1100174 attribute has a cardinality of zero or one 1100176 meaning that for each instance of the SalesTerms 1100170 entity there may be one DistributionChannelCode 1100174 attribute.

The DivisionCode 1100180 attribute is a DivisionCode 1100184 datatype. The DivisionCode 1100180 attribute has a cardinality of zero or one 1100182 meaning that for each instance of the SalesTerms 1100170 entity there may be one DivisionCode 1100180 attribute.

The DateTerms 1100186 package includes a DateTerms 1100188 entity. The DateTerms 1100188 entity has a cardinality of zero or one 1100190 meaning that for each instance of the CustomerQuote 110022 entity there may be one DateTerms 1100188 entity. The DateTerms 1100188 entity includes various attributes, namely RequestDate 1100192, ValidityStartTimePointDate 1100198 and ValidityEndTimePointDate 1100204.

The RequestDate 1100192 attribute is a Date 1100196 datatype. The RequestDate 1100192 attribute has a cardinality of zero or one 1100194 meaning that for each instance of the DateTerms 1100188 entity there may be one RequestDate 1100192 attribute.

The ValidityStartTimePointDate 1100198 attribute is a Date 1100202 datatype. The ValidityStartTimePointDate 1100198 attribute has a cardinality of zero or one 1100200 meaning that for each instance of the DateTerms 1100188 entity there may be one ValidityStartTimePointDate 1100198 attribute.

The ValidityEndTimePointDate 1100204 attribute is a Date 1100208 datatype. The ValidityEndTimePointDate 1100204 attribute has a cardinality of zero or one 1100206 meaning that for each instance of the DateTerms 1100188 entity there may be one ValidityEndTimePointDate 1100204 attribute.

The PricingTerms 1100210 package includes a PricingTerms 1100212 entity. The PricingTerms 1100212 entity has a cardinality of zero or one 1100214 meaning that for each instance of the CustomerQuote 110022 entity there may be one PricingTerms 1100212 entity. The PricingTerms 1100212 entity includes various attributes, namely CurrencyCode 1100216 and PriceDeterminationDate 1100222.

The CurrencyCode 1100216 attribute is a CurrencyCode 1100220 datatype. The CurrencyCode 1100216 attribute has a cardinality of zero or one 1100218 meaning that for each instance of the PricingTerms 1100212 entity there may be one CurrencyCode 1100216 attribute.

The PriceDeterminationDate 1100222 attribute is a Date 1100226 datatype. The PriceDeterminationDate 1100222 attribute has a cardinality of zero or one 1100224 meaning that for each instance of the PricingTerms 1100212 entity there may be one PriceDeterminationDate 1100222 attribute.

The DeliveryTerms 1100228 package includes a DeliveryTerms 1100230 entity. The DeliveryTerms 1100230 entity has a cardinality of zero or one 1100232 meaning that for each instance of the CustomerQuote 110022 entity there may be one DeliveryTerms 1100230 entity. The DeliveryTerms 1100230 entity includes an Incoterms 1100234 attribute.

The Incoterms 1100234 attribute is an Incoterms 1100238 datatype. The Incoterms 1100234 attribute has a cardinality of zero or one 1100236 meaning that for each instance of the DeliveryTerms 1100230 entity there may be one Incoterms 1100234 attribute.

The InvoiceTerms 1100240 package includes an InvoiceTerms 1100242 entity. The InvoiceTerms 1100242 entity has a cardinality of zero or one 1100244 meaning that for each instance of the CustomerQuote 110022 entity there may be one InvoiceTerms 1100242 entity. The InvoiceTerms 1100242 entity includes an InvoicingDate 1100246 attribute.

The InvoicingDate 1100246 attribute is a Date 1100250 datatype. The InvoicingDate 1100246 attribute has a cardinality of zero or one 1100248 meaning that for each instance of the InvoiceTerms 1100242 entity there may be one InvoicingDate 1100246 attribute.

The TotalValues 1100252 package includes a TotalValues 1100254 entity. The TotalValues 1100254 entity has a cardinality of zero or one 1100256 meaning that for each instance of the CustomerQuote 110022 entity there may be one TotalValues 1100254 entity. The TotalValues 1100254 entity includes various attributes, namely GrossWeightMeasure 1100258 and NetAmount 1100264.

The GrossWeightMeasure 1100258 attribute is a Measure 1100262 datatype. The GrossWeightMeasure 1100258 attribute has a cardinality of zero or one 1100260 meaning that for each instance of the TotalValues 1100254 entity there may be one GrossWeightMeasure 1100258 attribute.

The NetAmount 1100264 attribute is an Amount 1100268 datatype. The NetAmount 1100264 attribute has a cardinality of zero or one 1100266 meaning that for each instance of the TotalValues 1100254 entity there may be one NetAmount 1100264 attribute.

The Item 1100270 package includes an Item 1100272 entity. The Item 1100270 package includes various packages, namely ProductInformation 1100288, Party 1100300, Location 1100382, DeliveryTerms 1100394, InvoiceTerms 1100406 and TotalValues 1100418.

The Item 1100272 entity has a cardinality of zero or n 1100274 meaning that for each instance of the CustomerQuote 110022 entity there may be one or more Item 1100272 entities. The Item 1100272 entity includes various attributes, namely ID 1100276 and Description 1100282.

The ID 1100276 attribute is a CustomerQuoteItemID 1100280 datatype. The ID 1100276 attribute has a cardinality of one 1100278 meaning that for each instance of the Item 1100272 entity there is one ID 1100276 attribute.

The Description 1100282 attribute is a SHORT_Description 1100286 datatype. The Description 1100282 attribute has a cardinality of zero or one 1100284 meaning that for each instance of the Item 1100272 entity there may be one Description 1100282 attribute.

The ProductInformation 1100288 package includes a Product 1100290 entity. The Product 1100290 entity has a cardinality of zero or one 1100292 meaning that for each instance of the Item 1100272 entity there may be one Product 1100290 entity. The Product 1100290 entity includes a SellerID 1100294 attribute.

The SellerID 1100294 attribute is a ProductPartyID 1100298 datatype. The SellerID 1100294 attribute has a cardinality of one 1100296 meaning that for each instance of the Product 1100290 entity there is one SellerID 1100294 attribute.

The Party 1100300 package includes various entities, namely BuyerParty 1100302, GoodsRecipientParty 1100318, BillToParty 1100334, PayerParty 1100350 and ResponsibleEmployeeParty 1100366.

The BuyerParty 1100302 entity has a cardinality of zero or one 1100304 meaning that for each instance of the Item 1100272 entity there may be one BuyerParty 1100302 entity. The BuyerParty 1100302 entity includes various attributes, namely InternalID 1100306 and FormattedName 1100312.

The InternalID 1100306 attribute is a PartyInternalID 1100310 datatype. The InternalID 1100306 attribute has a cardinality of one 1100308 meaning that for each instance of the BuyerParty 1100302 entity there is one InternalID 1100306 attribute.

The FormattedName 1100312 attribute is a LONG_Name, Qualifier:PartyFormatted 1100316 datatype. The FormattedName 1100312 attribute has a cardinality of zero or one 1100314 meaning that for each instance of the BuyerParty 1100302 entity there may be one FormattedName 1100312 attribute.

The GoodsRecipientParty 1100318 entity has a cardinality of zero or one 1100320 meaning that for each instance of the Item 1100272 entity there may be one GoodsRecipientParty 1100318 entity. The GoodsRecipientParty 1100318 entity includes various attributes, namely InternalID 1100322 and FormattedName 1100328.

The InternalID 1100322 attribute is a PartyInternalID 1100326 datatype. The InternalID 1100322 attribute has a cardinality of one 1100324 meaning that for each instance of the GoodsRecipientParty 1100318 entity there is one InternalID 1100322 attribute.

The FormattedName 1100328 attribute is a LONG_Name, Qualifier:PartyFormatted 1100332 datatype. The FormattedName 1100328 attribute has a cardinality of zero or one 1100330 meaning that for each instance of the GoodsRecipientParty 1100318 entity there may be one FormattedName 1100328 attribute.

The BillToParty 1100334 entity has a cardinality of zero or one 1100336 meaning that for each instance of the Item 1100272 entity there may be one BillToParty 1100334 entity. The BillToParty 1100334 entity includes various attributes, namely InternalID 1100338 and FormattedName 1100344.

The InternalID 1100338 attribute is a PartyInternalID 1100342 datatype. The InternalID 1100338 attribute has a cardinality of one 1100340 meaning that for each instance of the BillToParty 1100334 entity there is one InternalID 1100338 attribute.

The FormattedName 1100344 attribute is a LONG_Name, Qualifier:PartyFormatted 1100348 datatype. The FormattedName 1100344 attribute has a cardinality of zero or one 1100346 meaning that for each instance of the BillToParty 1100334 entity there may be one FormattedName 1100344 attribute.

The PayerParty 1100350 entity has a cardinality of zero or one 1100352 meaning that for each instance of the Item 1100272 entity there may be one PayerParty 1100350 entity. The PayerParty 1100350 entity includes various attributes, namely InternalID 1100354 and FormattedName 1100360.

The InternalID 1100354 attribute is a PartyInternalID 1100358 datatype. The InternalID 1100354 attribute has a cardinality of one 1100356 meaning that for each instance of the PayerParty 1100350 entity there is one InternalID 1100354 attribute.

The FormattedName 1100360 attribute is a LONG_Name, Qualifier:PartyFormatted 1100364 datatype. The FormattedName 1100360 attribute has a cardinality of zero or one 1100362 meaning that for each instance of the PayerParty 1100350 entity there may be one FormattedName 1100360 attribute.

The ResponsibleEmployeeParty 1100366 entity has a cardinality of zero or one 1100368 meaning that for each instance of the Item 1100272 entity there may be one ResponsibleEmployeeParty 1100366 entity. The ResponsibleEmployeeParty 1100366 entity includes various attributes, namely InternalID 1100370 and FormattedName 1100376.

The InternalID 1100370 attribute is a PartyInternalID 1100374 datatype. The InternalID 1100370 attribute has a cardinality of one 1100372 meaning that for each instance of the ResponsibleEmployeeParty 1100366 entity there is one InternalID 1100370 attribute.

The FormattedName 1100376 attribute is a LANGUAGEINDEPENDENT_LONG_Name,Qualifier:PersonFormatted 1100380 datatype. The FormattedName 1100376 attribute has a cardinality of zero or one 1100378 meaning that for each instance of the ResponsibleEmployeeParty 1100366 entity there may be one FormattedName 1100376 attribute.

The Location 1100382 package includes a ShipToLocation 1100384 entity. The ShipToLocation 1100384 entity has a cardinality of zero or one 1100386 meaning that for each instance of the Item 1100272 entity there may be one ShipToLocation 1100384 entity. The ShipToLocation 1100384 entity includes a BuyerID 1100388 attribute.

The BuyerID 1100388 attribute is a LocationPartyID 1100392 datatype. The BuyerID 1100388 attribute has a cardinality of zero or one 1100390 meaning that for each instance of the ShipToLocation 1100384 entity there may be one BuyerID 1100388 attribute.

The DeliveryTerms 1100394 package includes a DeliveryTerms 1100396 entity. The DeliveryTerms 1100396 entity has a cardinality of zero or one 1100398 meaning that for each instance of the Item 1100272 entity there may be one DeliveryTerms 1100396 entity. The DeliveryTerms 1100396 entity includes an Incoterms 1100400 attribute.

The Incoterms 1100400 attribute is an Incoterms 1100404 datatype. The Incoterms 1100400 attribute has a cardinality of zero or one 1100402 meaning that for each instance of the DeliveryTerms 1100396 entity there may be one Incoterms 1100400 attribute.

The InvoiceTerms 1100406 package includes an InvoiceTerms 1100408 entity. The InvoiceTerms 1100408 entity has a cardinality of zero or one 1100410 meaning that for each instance of the Item 1100272 entity there may be one InvoiceTerms 1100408 entity. The InvoiceTerms 1100408 entity includes an InvoiceDate 1100412 attribute.

The InvoiceDate 1100412 attribute is a Date 1100416 datatype. The InvoiceDate 1100412 attribute has a cardinality of zero or one 1100414 meaning that for each instance of the InvoiceTerms 1100408 entity there may be one InvoiceDate 1100412 attribute.

The TotalValues 1100418 package includes a TotalValues 1100420 entity. The TotalValues 1100420 entity has a cardinality of zero or one 1100422 meaning that for each instance of the Item 1100272 entity there may be one TotalValues 1100420 entity. The TotalValues 1100420 entity includes various attributes, namely RequestedQuantity 1100424, ConfirmedQuantity 1100430, GrossWeightMeasure 1100436, NetWeightMeasure 1100442, VolumeMeasure 1100448, NetAmount 1100454 and NetPrice 1100460.

The RequestedQuantity 1100424 attribute is a Quantity 1100428 datatype. The RequestedQuantity 1100424 attribute has a cardinality of zero or one 1100426 meaning that for each instance of the TotalValues 1100420 entity there may be one RequestedQuantity 1100424 attribute.

The ConfirmedQuantity 1100430 attribute is a Quantity 1100434 datatype. The ConfirmedQuantity 1100430 attribute has a cardinality of zero or one 1100432 meaning that for each instance of the TotalValues 1100420 entity there may be one ConfirmedQuantity 1100430 attribute.

The GrossWeightMeasure 1100436 attribute is a Measure 1100440 datatype. The GrossWeightMeasure 1100436 attribute has a cardinality of zero or one 1100438 meaning that for each instance of the TotalValues 1100420 entity there may be one GrossWeightMeasure 1100436 attribute.

The NetWeightMeasure 1100442 attribute is a Measure 1100446 datatype. The NetWeightMeasure 1100442 attribute has a cardinality of zero or one 1100444 meaning that for each instance of the TotalValues 1100420 entity there may be one NetWeightMeasure 1100442 attribute.

The VolumeMeasure 1100448 attribute is a Measure 1100452 datatype. The VolumeMeasure 1100448 attribute has a cardinality of zero or one 1100450 meaning that for each instance of the TotalValues 1100420 entity there may be one VolumeMeasure 1100448 attribute.

The NetAmount 1100454 attribute is an Amount 1100458 datatype. The NetAmount 1100454 attribute has a cardinality of zero or one 1100456 meaning that for each instance of the TotalValues 1100420 entity there may be one NetAmount 1100454 attribute.

The NetPrice 1100460 attribute is a Price 1100464 datatype. The NetPrice 1100460 attribute has a cardinality of zero or one 1100462 meaning that for each instance of the TotalValues 1100420 entity there may be one NetPrice 1100460 attribute.

The Log 1100466 package is a Log 1100472 datatype. The Log 1100466 package includes a Log 1100468 entity.

The Log 1100468 entity has a cardinality of one 1100470 meaning that for each instance of the CustomerQuoteByIDResponseMessage_sync 110002 entity there is one Log 1100468 entity.

Message Data Type

FIG. 112 shows a CustomerQuoteUserStatusChangeConfirmationMessage_sync 112000 package. The CustomerQuoteUserStatusChangeConfirmationMessage_sync 112000 package is a CustomerQuoteUserStatusChangeConfirmationMessage_sync 112004 datatype. The CustomerQuoteUserStatus- ChangeConfirmationMessage_sync 112000 package includes a CustomerQuoteUserStatus-ChangeConfirmationMessage_sync 112002 entity. The CustomerQuoteUserStatusChangeConfirmationMessage_sync 112000 package includes various packages, namely CustomerQuote 112020 and Log 112038.

The CustomerQuote 112020 package includes a CustomerQuote 112022 entity. The CustomerQuote 112022 entity has a cardinality of zero or one 112024 meaning that for each instance of the CustomerQuoteUserStatus-ChangeConfirmationMessage_sync 112002 entity there may be one CustomerQuote 112022 entity. The CustomerQuote 112022 entity includes various attributes, namely ID 112026 and StatusObject 112032.

The ID 112026 attribute is a CustomerQuoteID 112030 datatype. The ID 112026 attribute has a cardinality of one 112028 meaning that for each instance of the CustomerQuote 112022 entity there is one ID 112026 attribute.

The StatusObject 112032 attribute is a StatusObject 112036 datatype. The StatusObject 112032 attribute has a cardinality of zero or one 112034 meaning that for each instance of the CustomerQuote 112022 entity there may be one StatusObject 112032 attribute.

The Log 112038 package is a Log 112044 datatype. The Log 112038 package includes a Log 112040 entity.

The Log 112040 entity has a cardinality of one 112042 meaning that for each instance of the CustomerQuoteUser-StatusChangeConfirmationMessage_sync 112002 entity there is one Log 112040 entity.

Message Data Type

FIGS. 113-1 through 113-2 show a CustomerQuoteUser-StatusChangeRequestMessage_sync 113000 package. The CustomerQuoteUserStatusChangeRequestMessage_sync 113000 package is a CustomerQuoteUserStatusChangeRequestMessage_sync 113004 datatype. The CustomerQuoteUserStatusChangeRequestMessage_sync 113000 package includes a CustomerQuoteUserStatusChangeRequestMessage_sync 113002 entity. The CustomerQuoteUserStatusChangeRequestMessage_sync 113000 package includes a CustomerQuote 113020 package.

The CustomerQuote 113020 package includes a CustomerQuote 113022 entity. The CustomerQuote 113022 entity has a cardinality of one 113024 meaning that for each instance of the CustomerQuoteUserStatusChangeRequestMessage_sync 113002 entity there is one CustomerQuote 113022 entity. The CustomerQuote 113022 entity includes an ID 113026 attribute. The CustomerQuote 113022 entity includes a StatusObject 113032 subordinate entity.

The ID 113026 attribute is a CustomerQuoteID 113030 datatype. The ID 113026 attribute has a cardinality of one 113028 meaning that for each instance of the CustomerQuote 113022 entity there is one ID 113026 attribute.

The StatusObject 113032 entity has a cardinality of one 113034 meaning that for each instance of the CustomerQuote 113022 entity there is one StatusObject 113032 entity. The StatusObject 113032 entity includes an UserStatusProfile-Code 113036 attribute. The StatusObject 113032 entity includes an UserStatus 113042 subordinate entity.

The UserStatusProfileCode 113036 attribute is an UserStatusProfileCode 113040 datatype. The UserStatusProfileCode 113036 attribute has a cardinality of one 113038 meaning that for each instance of the StatusObject 113032 entity there is one UserStatusProfileCode 113036 attribute.

The UserStatus 113042 entity has a cardinality of one 113044 meaning that for each instance of the StatusObject 113032 entity there is one UserStatus 113042 entity. The UserStatus 113042 entity includes various attributes, namely Code 113046 and ActiveIndicator 113052.

The Code 113046 attribute is an UserStatusCode 113050 datatype. The Code 113046 attribute has a cardinality of one 113048 meaning that for each instance of the UserStatus 113042 entity there is one Code 113046 attribute.

The ActiveIndicator 113052 attribute is an Indicator 113056 datatype. The ActiveIndicator 113052 attribute has a cardinality of one 113054 meaning that for each instance of the UserStatus 113042 entity there is one ActiveIndicator 113052 attribute.

CustomerRequirement Interfaces

The interfaces of the CustomerRequirement provide following operations: create or change a CustomerRequirement in Customer Requirement Processing System; cancel a CustomerRequirement in Customer Requirement Processing System; and execute a query for a CustomerRequirement in Customer Requirement Processing System. These interfaces can be used in the scenario "Availability Check and Reservation."

Message Choreography

Figure 114:
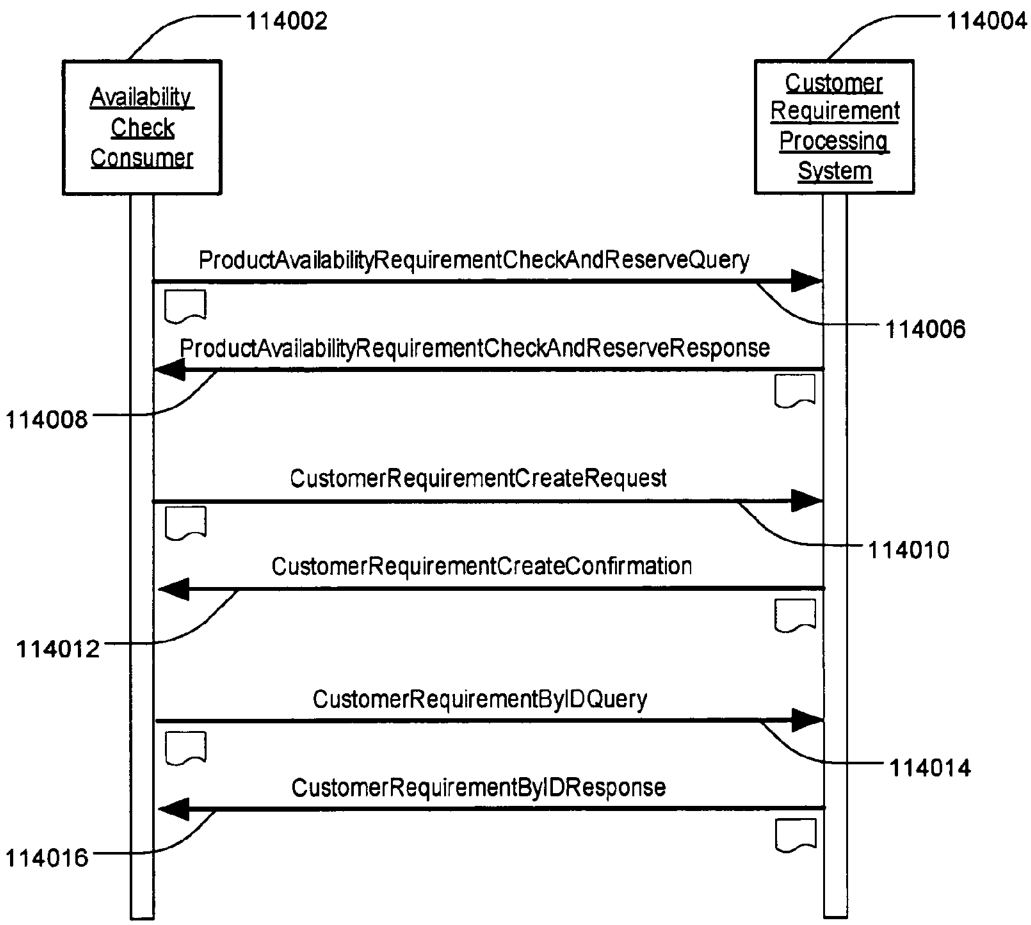
FIG. 114 shows an example CustomerRequirement Availability Check Consumer Message Choreography.
Figure 115:
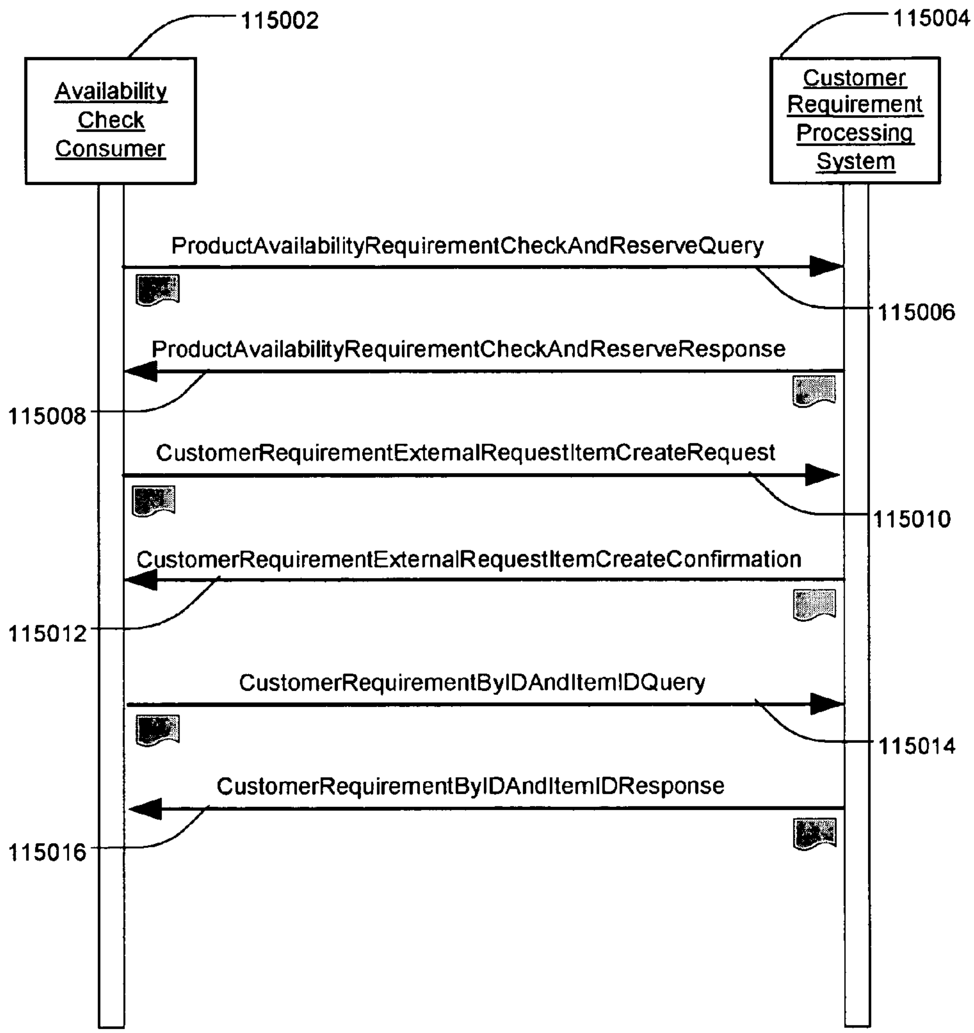
FIG. 115 shows an example CustomerRequirement Availability Check Consumer Message Choreography.
Figure 116:
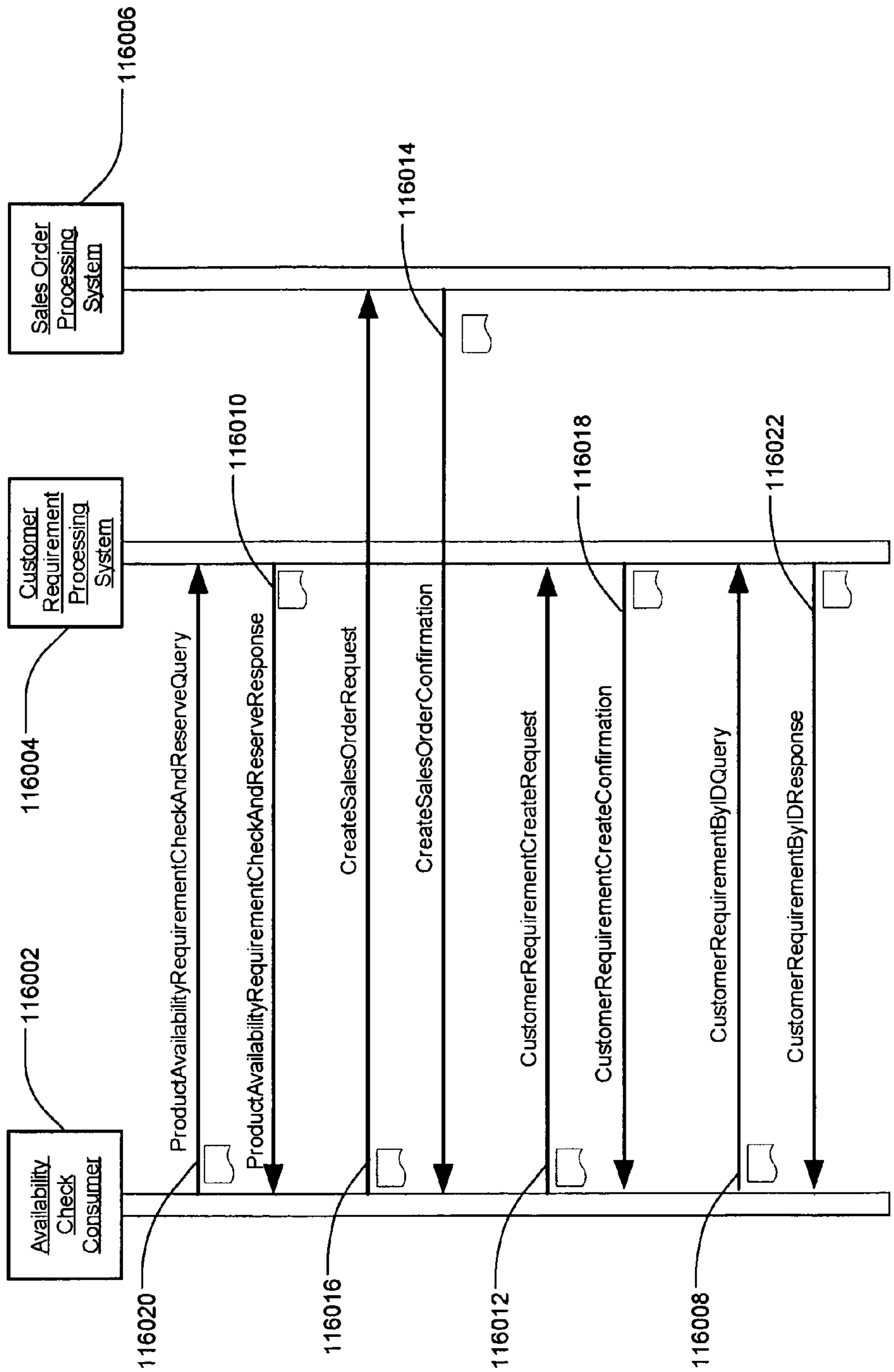
FIG. 116 shows an example CustomerRequirement Availability Check Consumer and Sales Order Processing System Message Choreography.
Figure 117:
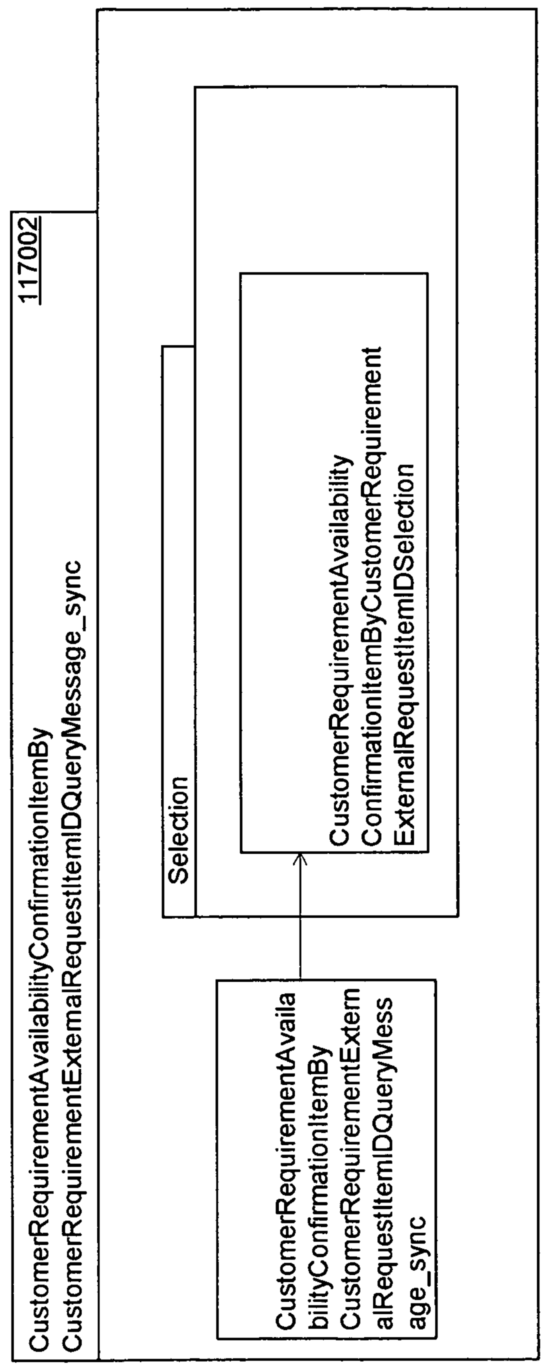
FIG. 117 shows an example CustomerRequirementAvailabilityConfirmationItemByCustomerRequirementExternalRequestItemIDQueryMessage_sync Message Data Type.
Figures 1, 118:
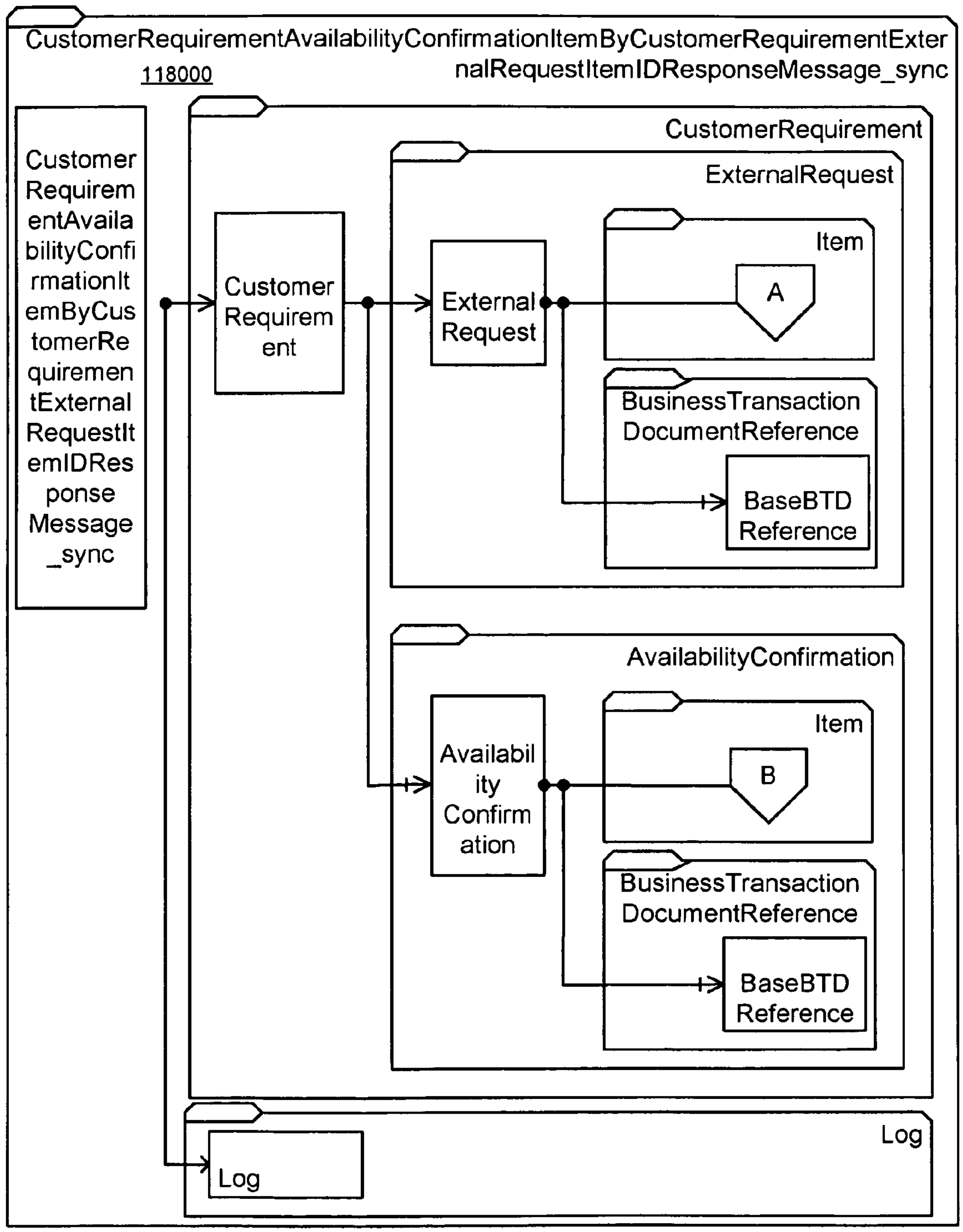
Figures 2, 118:
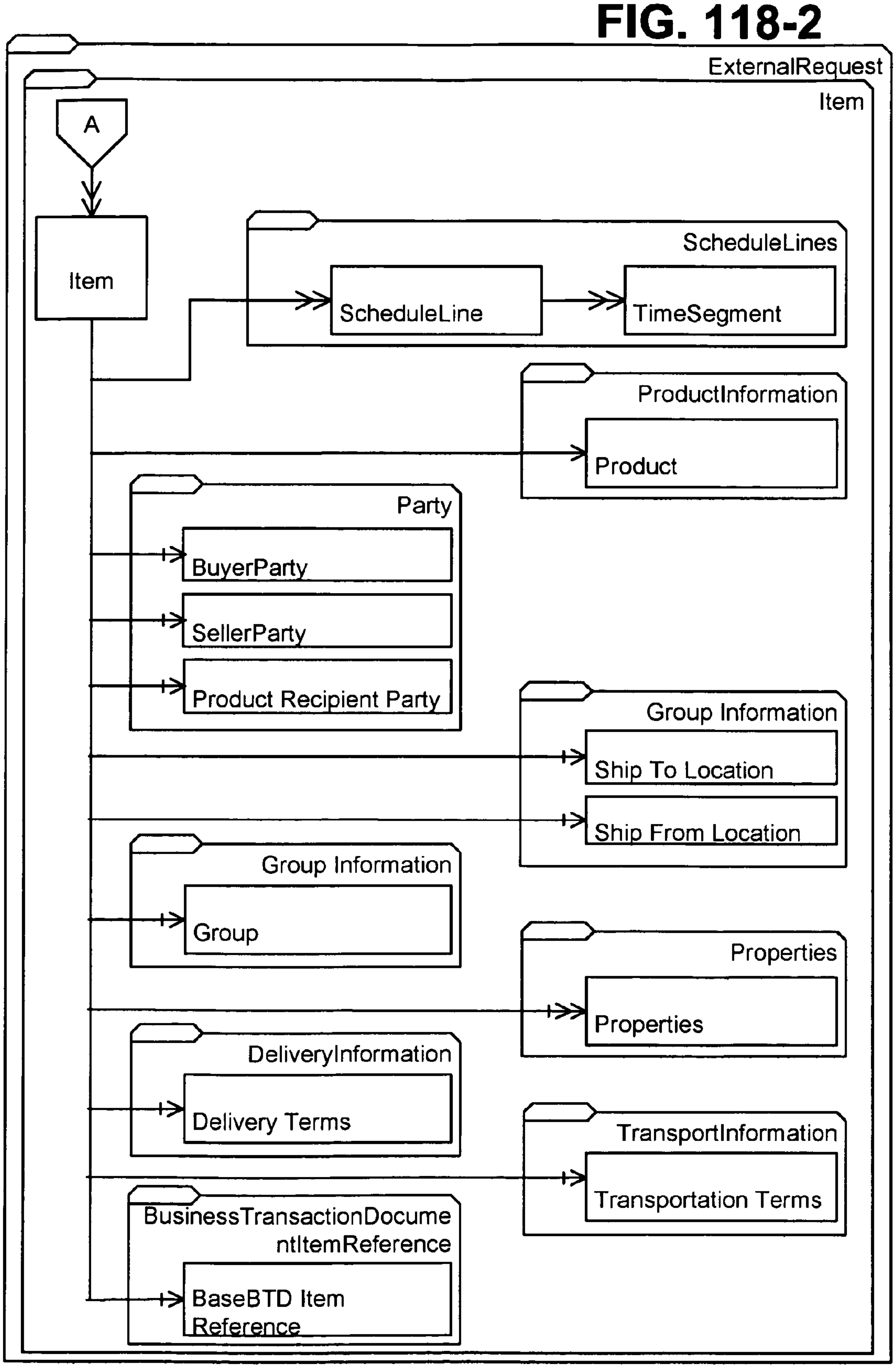
Figures 3, 118:
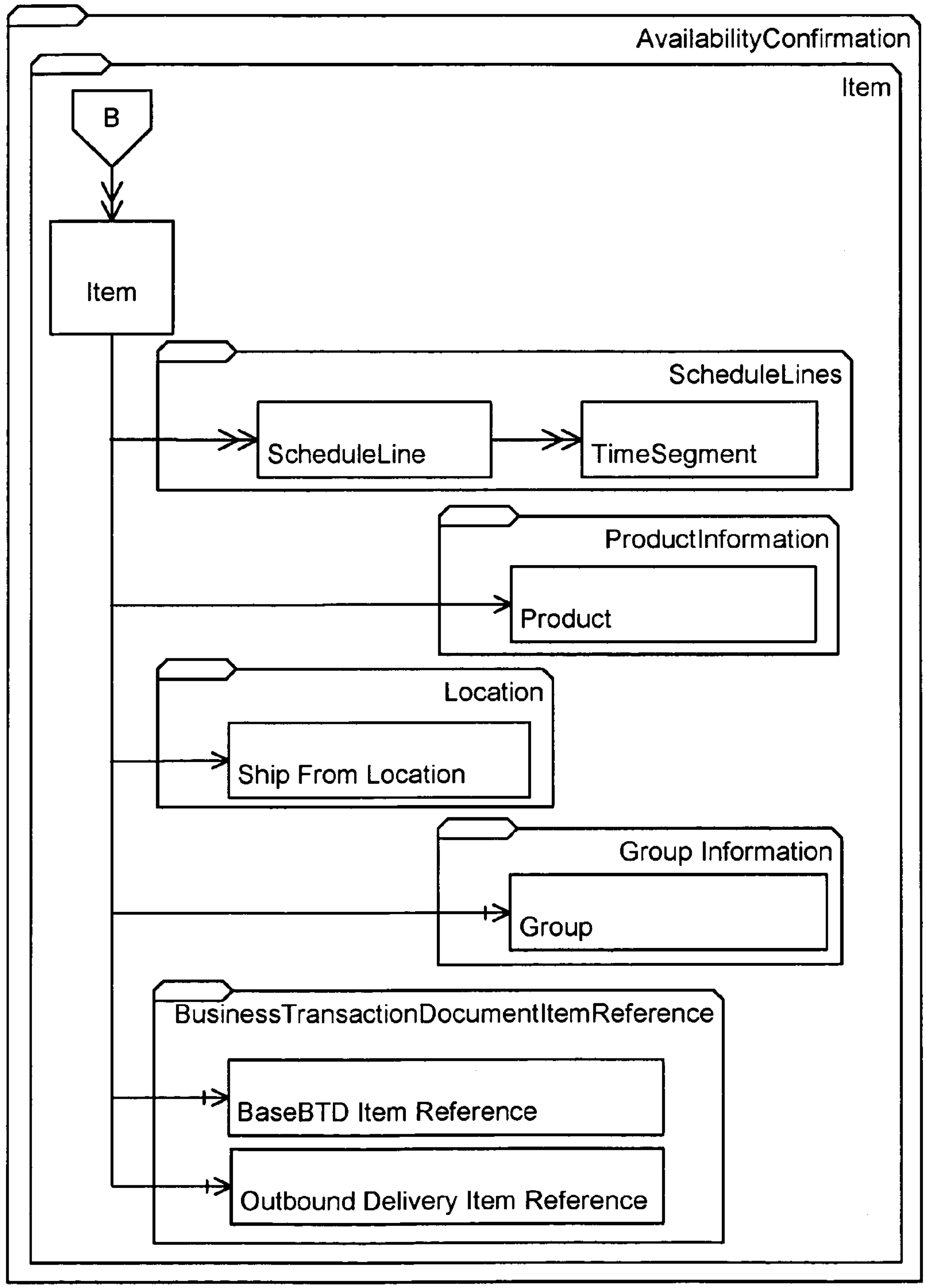
Figure 119:
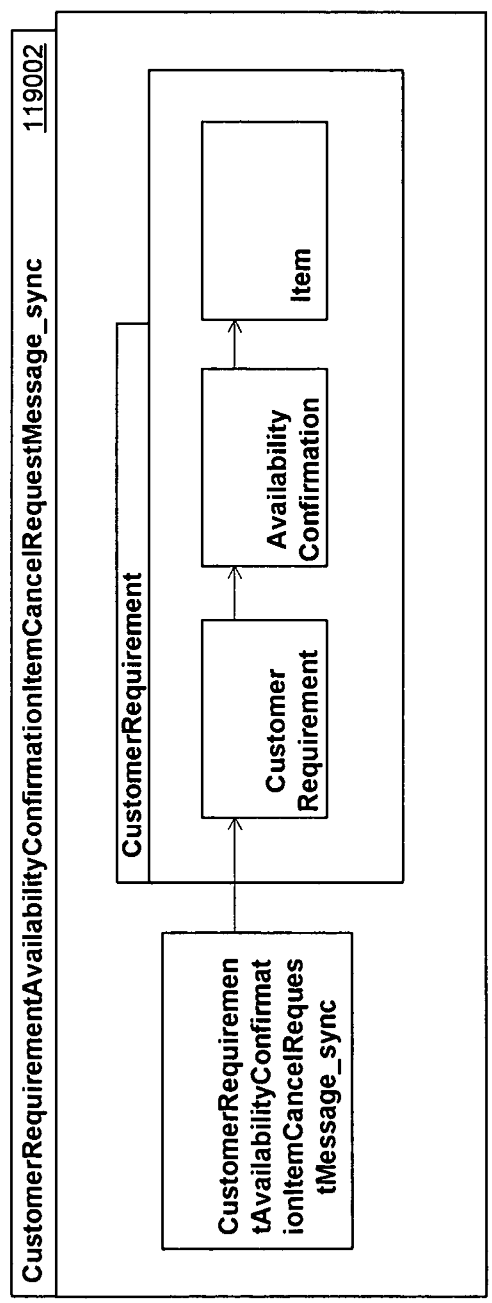
Figures 1, 120:
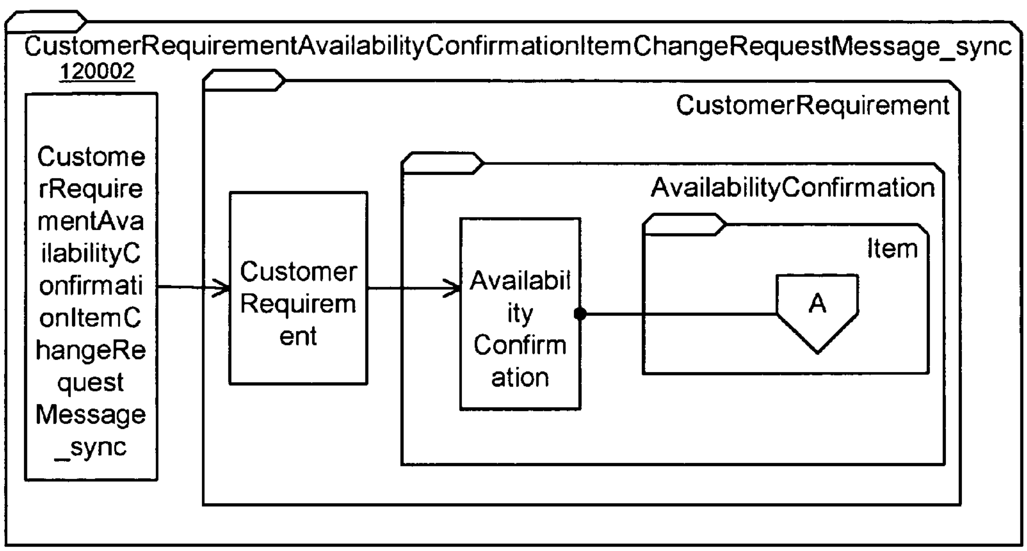
Figures 2, 120:
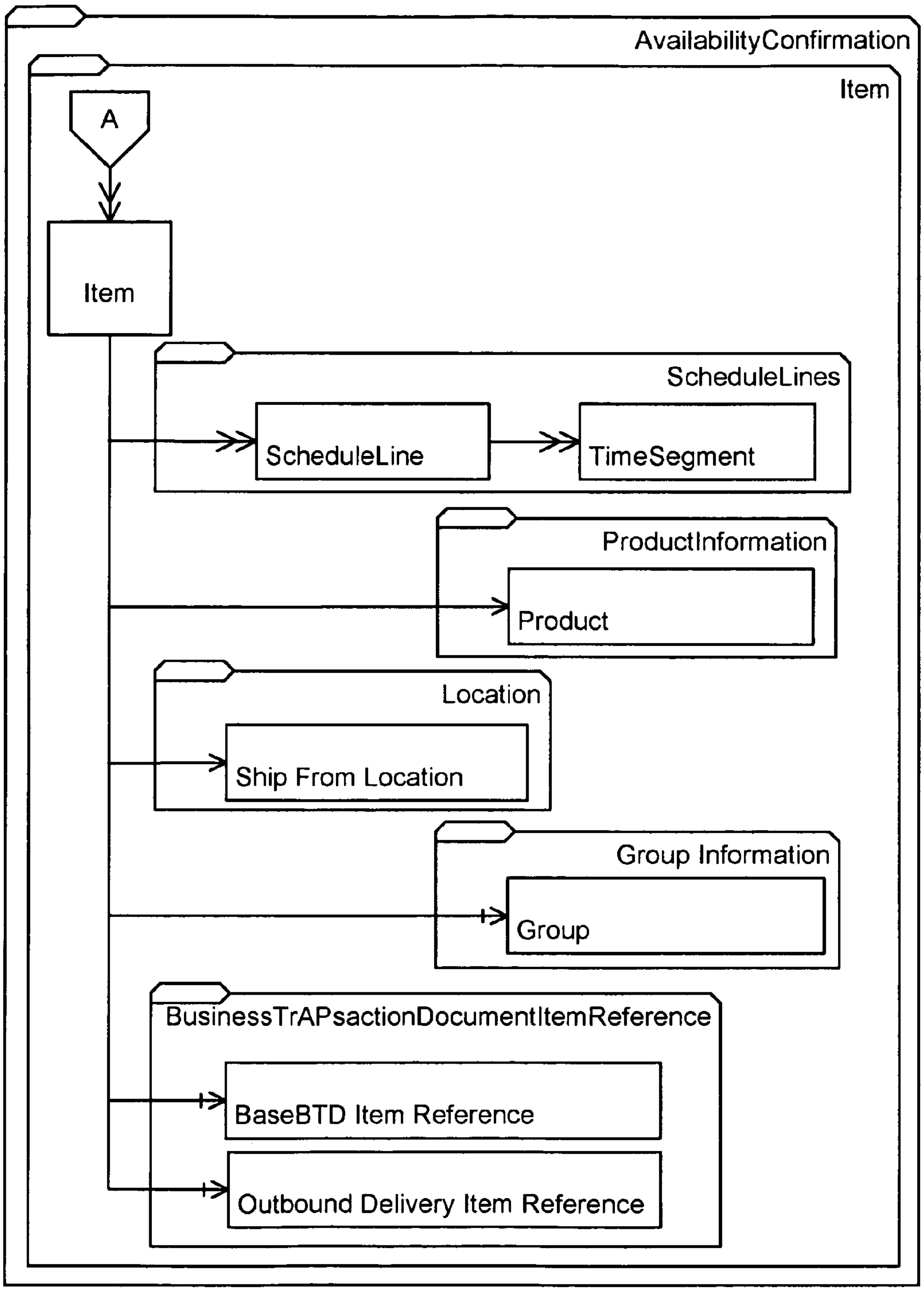
Figure 121:
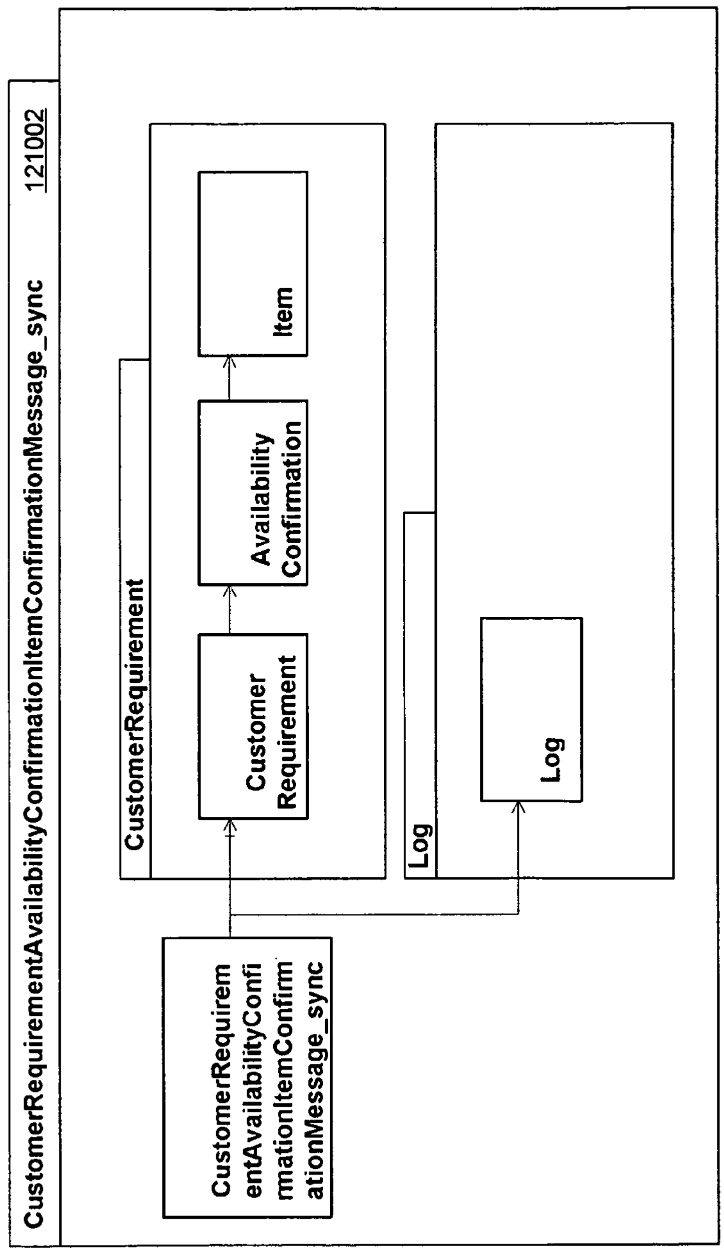
Figures 1, 122:
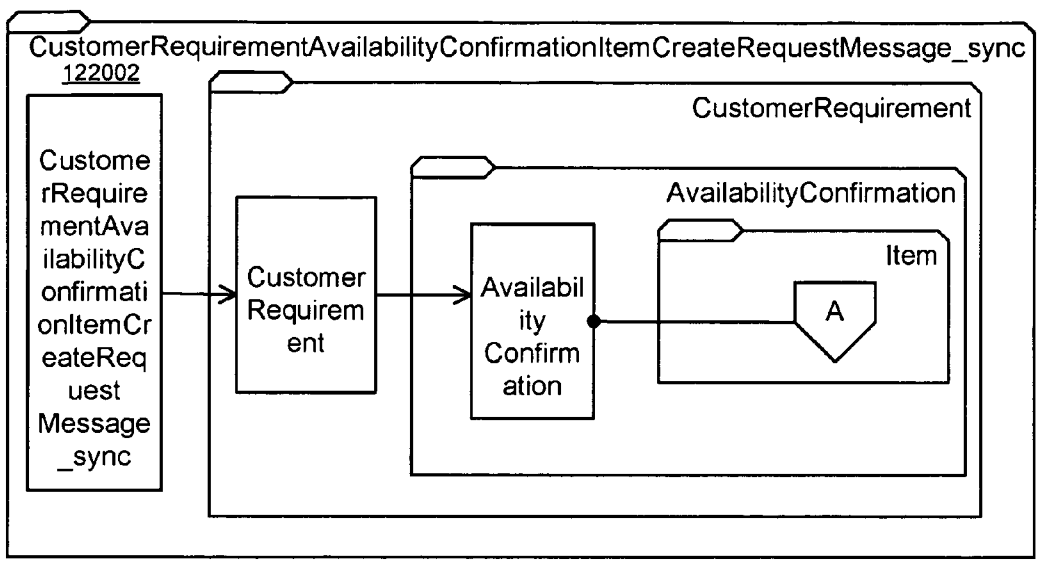
Figures 2, 122:
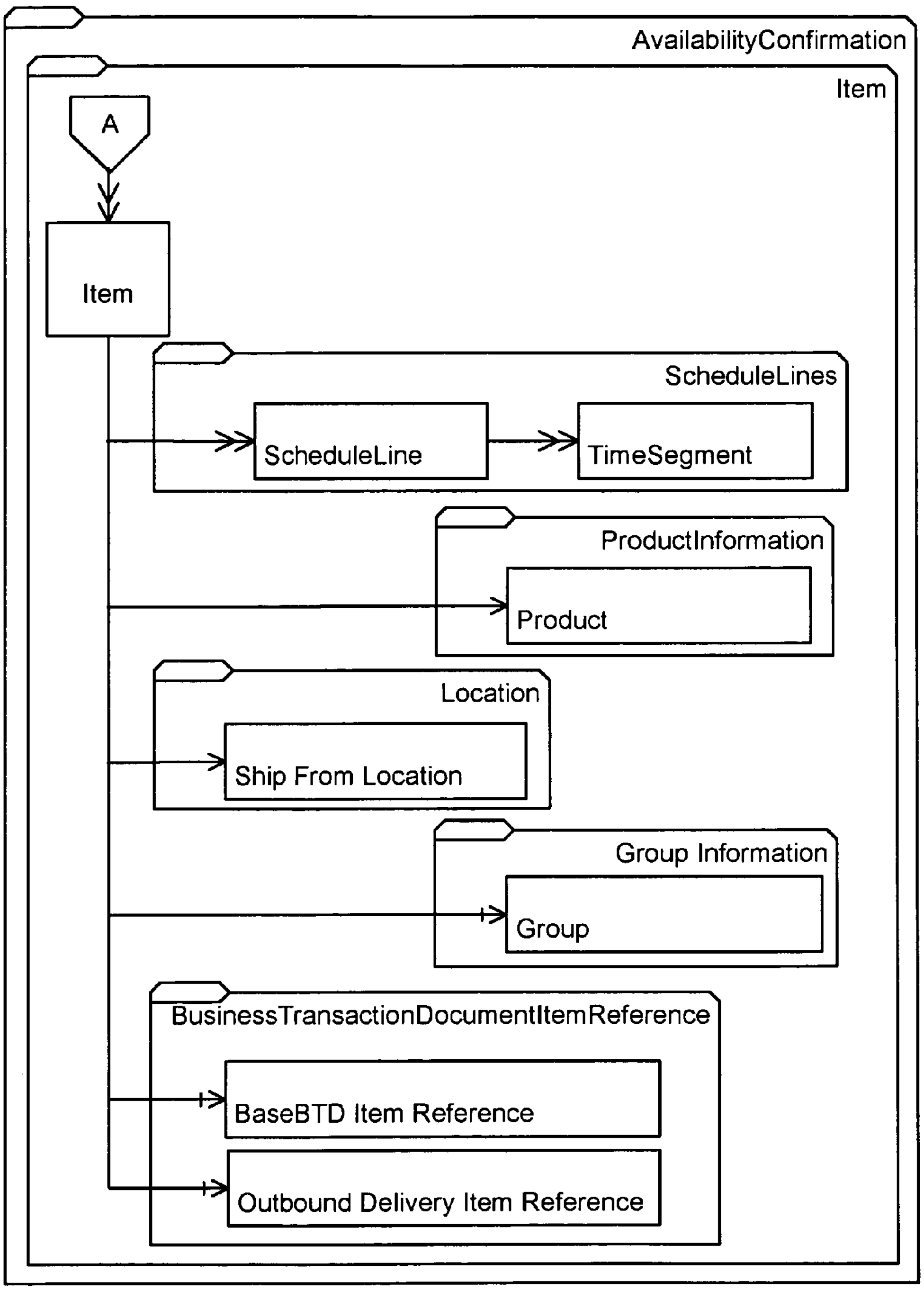

More generally, these interfaces may be utilized in various scenarios, included those illustrated in the message choreography FIGS. 114, 115, and 116. For example, such scenarios may include the following steps: 1) the service consumer selects a product and checks its availability (Customer Requirement Processing System performs an availability check and confirms the availability without reservation.); 2) the service consumer triggers an availability check with reservation; and 3) the service consumer either cancels the reservation or creates a sales order based on this reservation. In the latter case the service consumer creates a customer requirement in the Customer Requirement Processing system. These interfaces can also support sell scenarios that allow a sales department to perform the following: to confirm a quotation, a sales order, or a service order; and to deliver the confirmed quantity.

A CustomerRequirementCreateRequest_sync is a request to Customer Requirement Processing to create a customer requirement. A CustomerRequirementCreateConfirmation_sync is a confirmation to the CustomerRequirementCreateRequest_sync. A CustomerRequirementChangeRequest_sync is a request to change a customer requirement in Customer Requirement Processing System. A CustomerRequirementChangeConfirmation_sync is a confirmation to the CustomerRequirementChangeRequest_sync. A CustomerRequirementCancelRequest_sync is request to cancel a customer requirement in Customer Requirement Processing. A CustomerRequirementCancelConfirmation_sync is a confirmation to the CustomerRequirementCancelRequest_sync. A CustomerRequirementByIDQuery_sync is a query for a specified customer requirement. A CustomerRequirementByIDResponse_sync is the response to a CustomerRequirementByIDQuery_sync. A CustomerRequirementExternalRequestItemCreateRequest_sync is a request to Customer Requirement Processing to create an item of a customer requirement external request. A CustomerRequirementExternalRequestItemCreateConfirmation_sync is a confirmation to the CustomerRequirementExternalRequestItemCreateRequest_sync. A CustomerRequirementExternalRequestItemChangeRequest_sync is a request to Customer Requirement Processing to change an item of a customer requirement external request. A CustomerRequirementExternalRequestItemChangeConfirmation_sync is a confirmation to the CustomerRequirementExternalRequestItemChangeRequest_sync. A CustomerRequirementExternalRequestItemCancelRequest_sync is a request to cancel an item of a customer requirement external request in Customer Requirement Processing. A CustomerRequirementExternalRequestItemCancelConfirmation_sync is a confirmation to the CustomerRequirementExternalRequestItemCancelRequest_sync. A CustomerRequirementAvailabilityConfirmationItemCreateRequest_sync is a request to Customer Requirement Processing to create an item of a customer requirement availability confirmation. A CustomerRequirementAvailabilityConfirmationItemCreateConfirmation_sync is a confirmation to the CustomerRequirementAvailabilityConfirmationItemCreateRequest_sync. A CustomerRequirementAvailabilityConfirmationItemChangeRequest_sync is a request to Customer Requirement Processing to change an item of a customer requirement availability confirmation. A CustomerRequirementAvailabilityConfirmationItemChangeConfirmation_sync is a confirmation to the CustomerRequirementAvailabilityConfirmationItemChangeRequest_sync. A CustomerRequirementAvailabilityConfirmationItemCancelRequest_sync is a request to Customer Requirement Processing to cancel an item of a customer requirement availability confirmation. A CustomerRequirementAvailabilityConfirmationItemCancelConfirmation_sync is a confirmation to the CustomerRequirementAvailabilityConfirmationItemCancelRequest_sync. A CustomerRequirementAvailabilityConfirmationItemByCustomerRequirementExternalRequestItemIDQuery_sync is a query for specified items of a customer requirement availability confirmation. A CustomerRequirementAvailabilityConfirmationItemByCustomerRequirementExternalRequestItemIDResponse_sync is the response to a CustomerRequirementAvailabilityConfirmationItemByCustomerRequirementExternalRequestItemIDQuery_sync.

Figure 123:
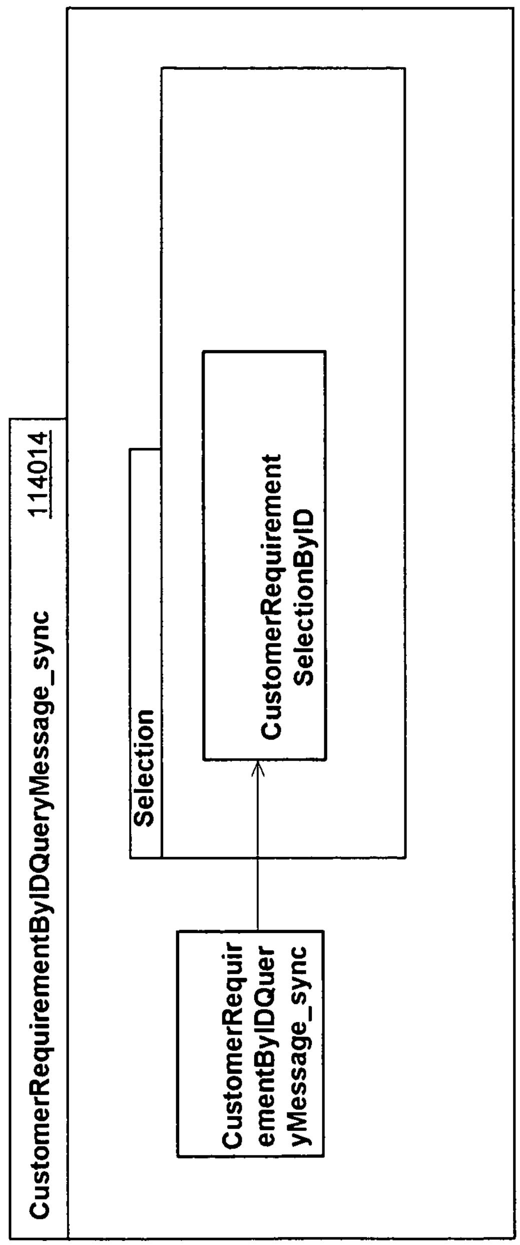
Figures 1, 124:
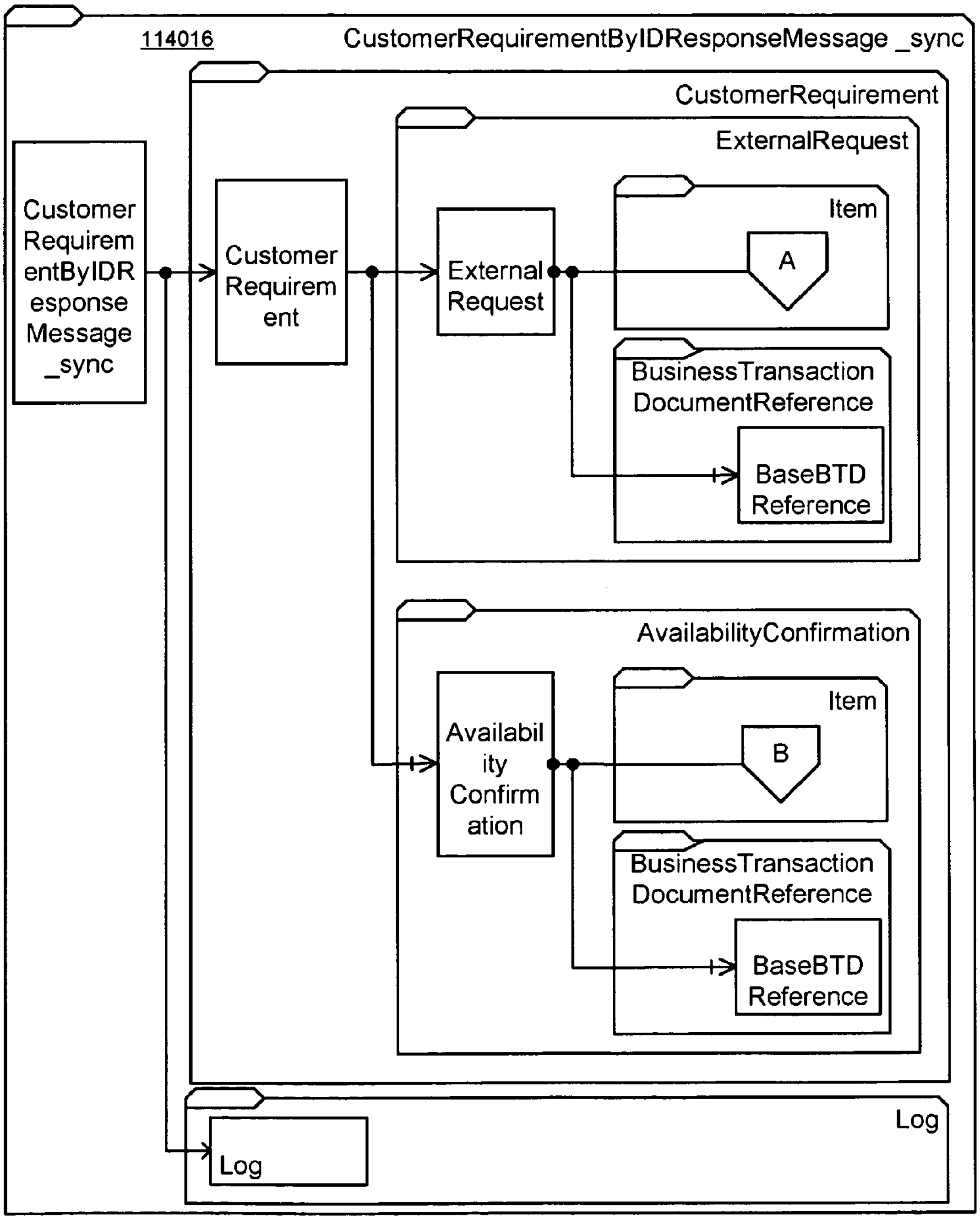
Figures 2, 124:
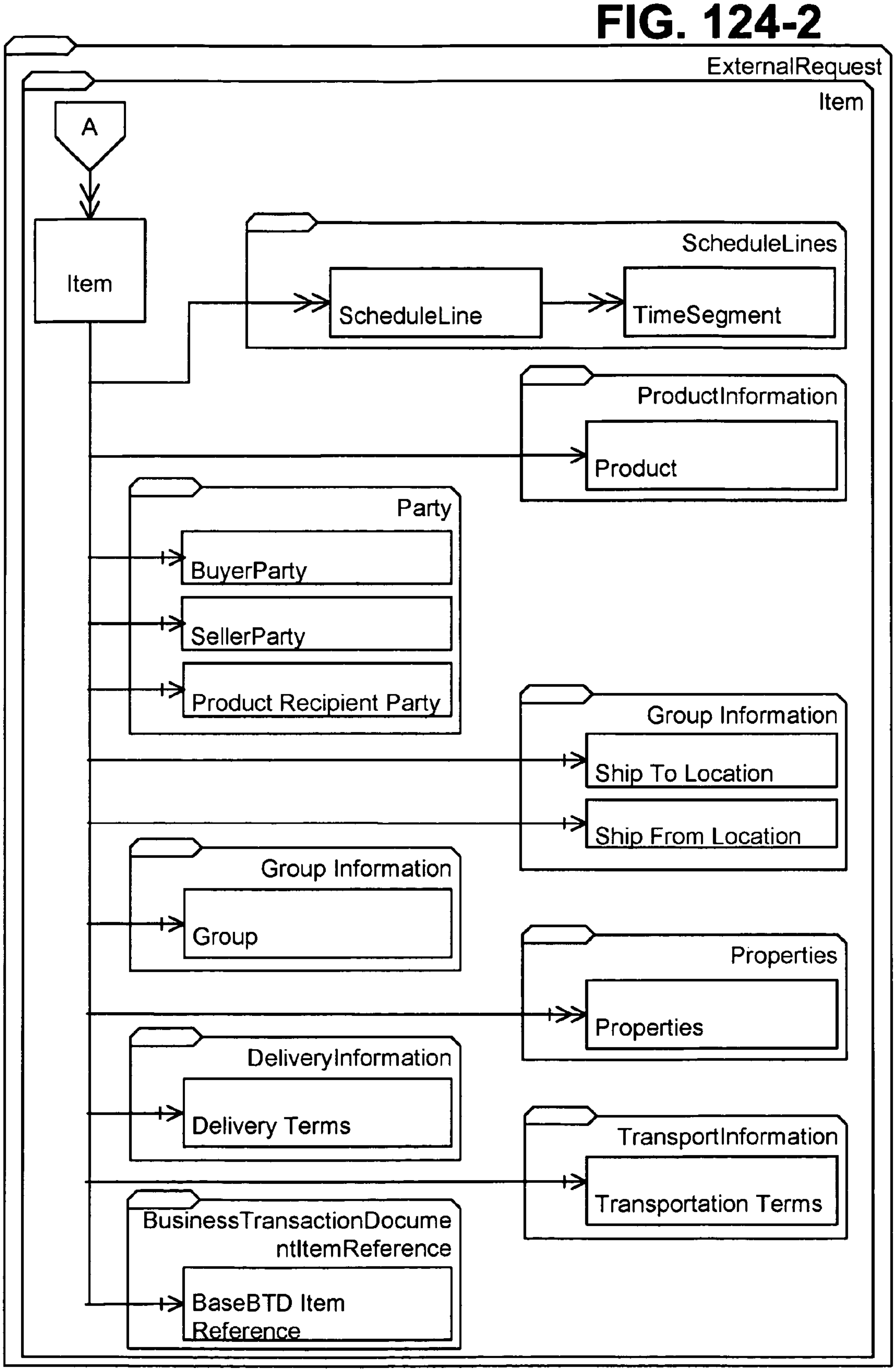
Figures 3, 124:
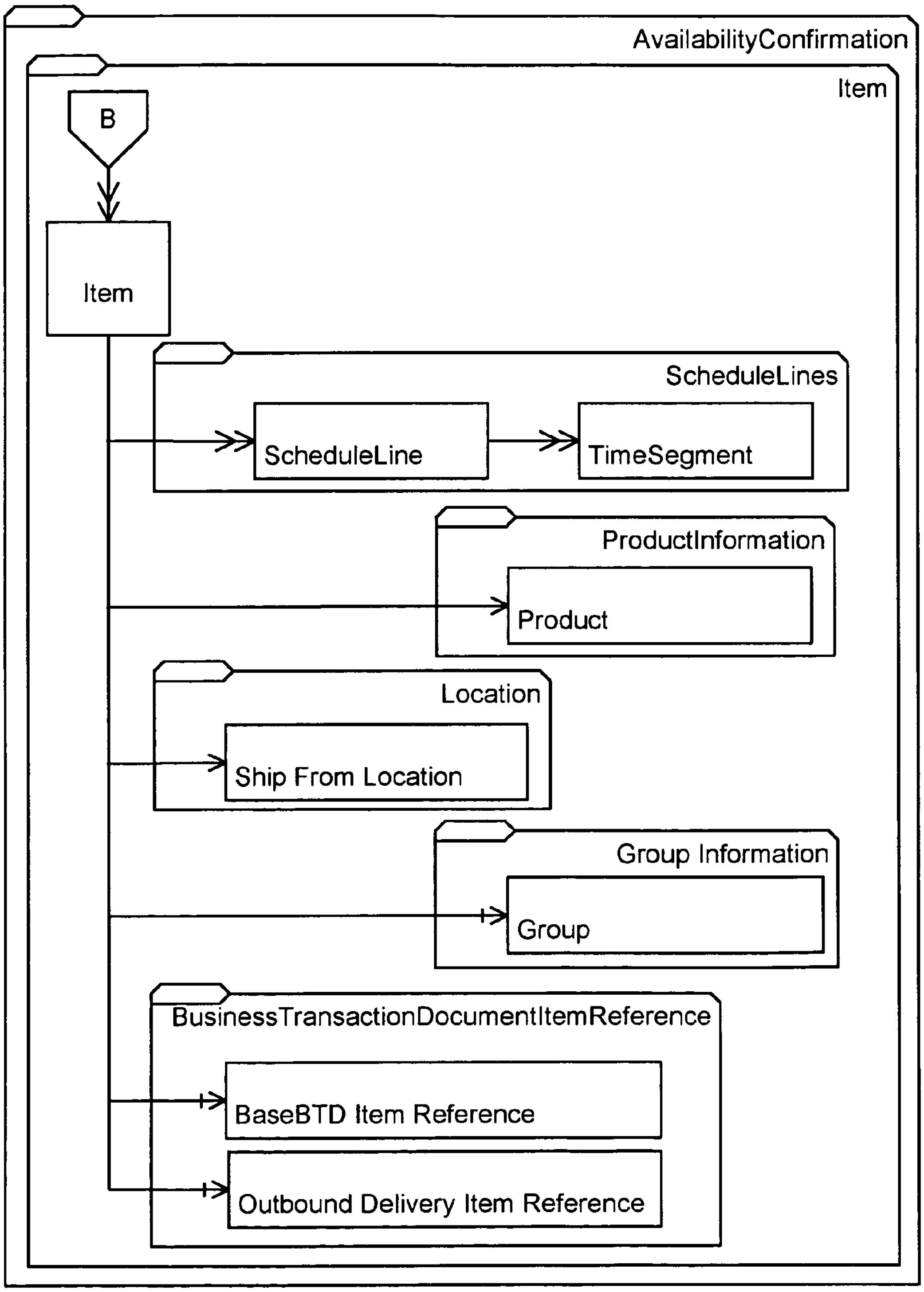
Figure 125:
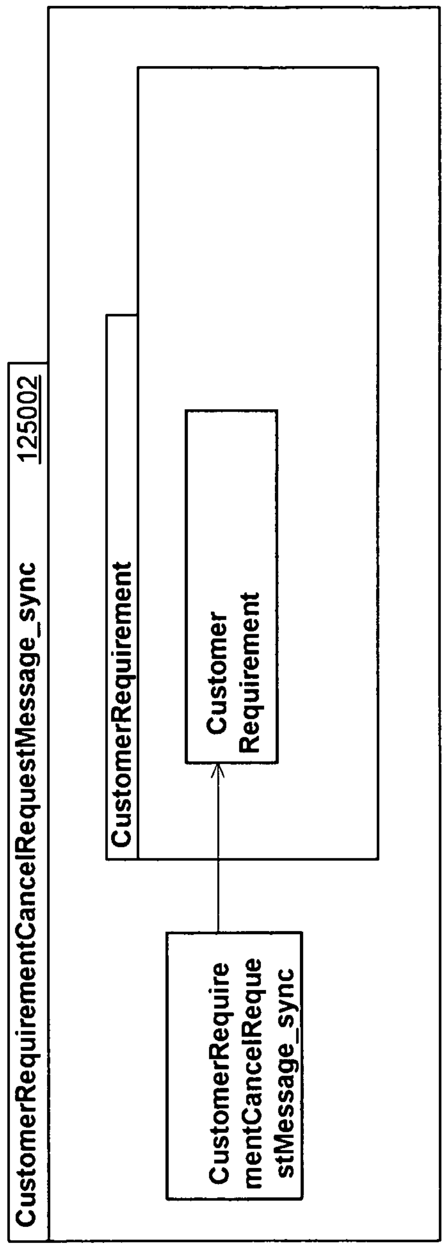
Figures 1, 126:
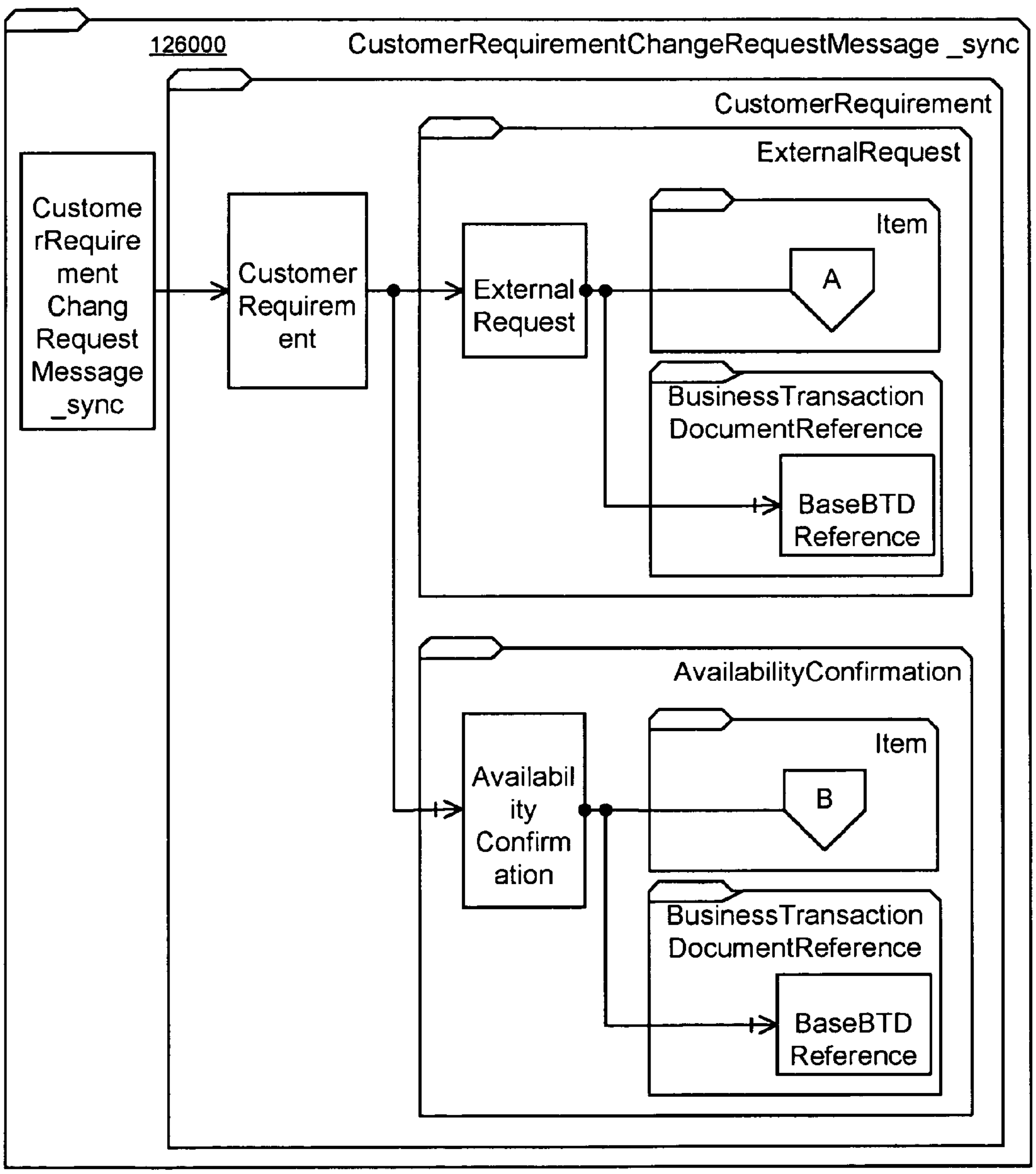
Figures 2, 126:
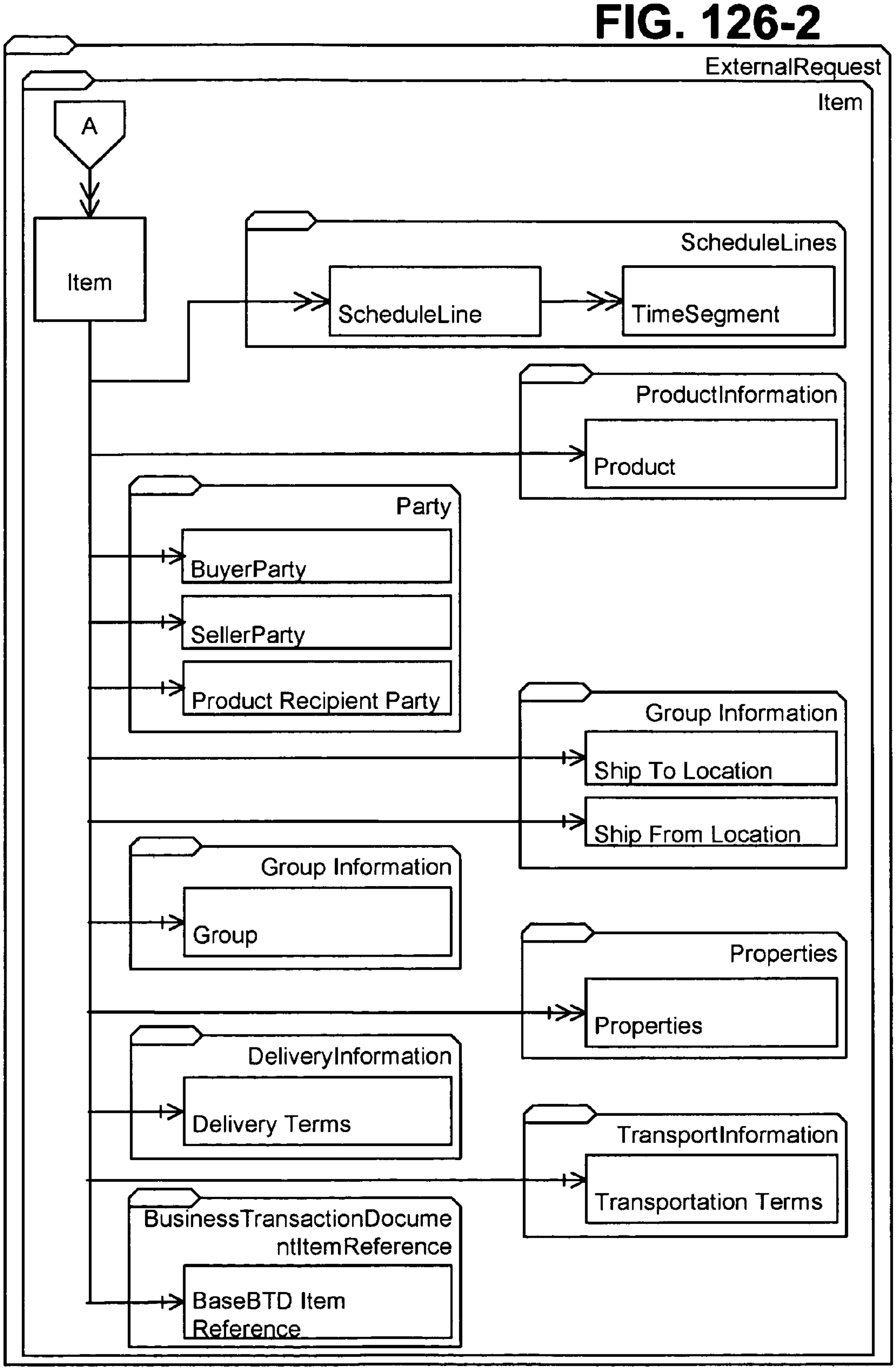
Figures 3, 126:
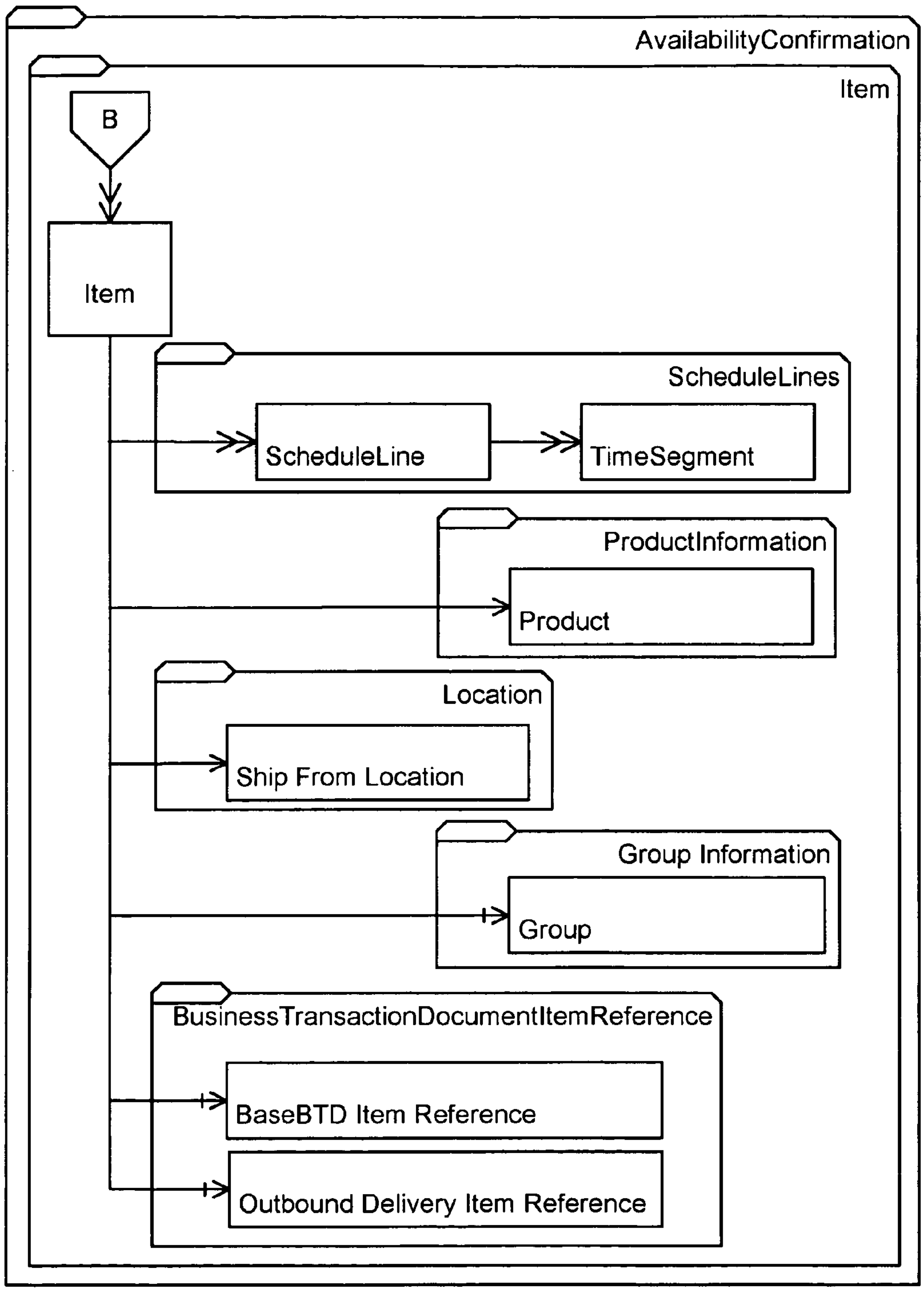
Figure 127:
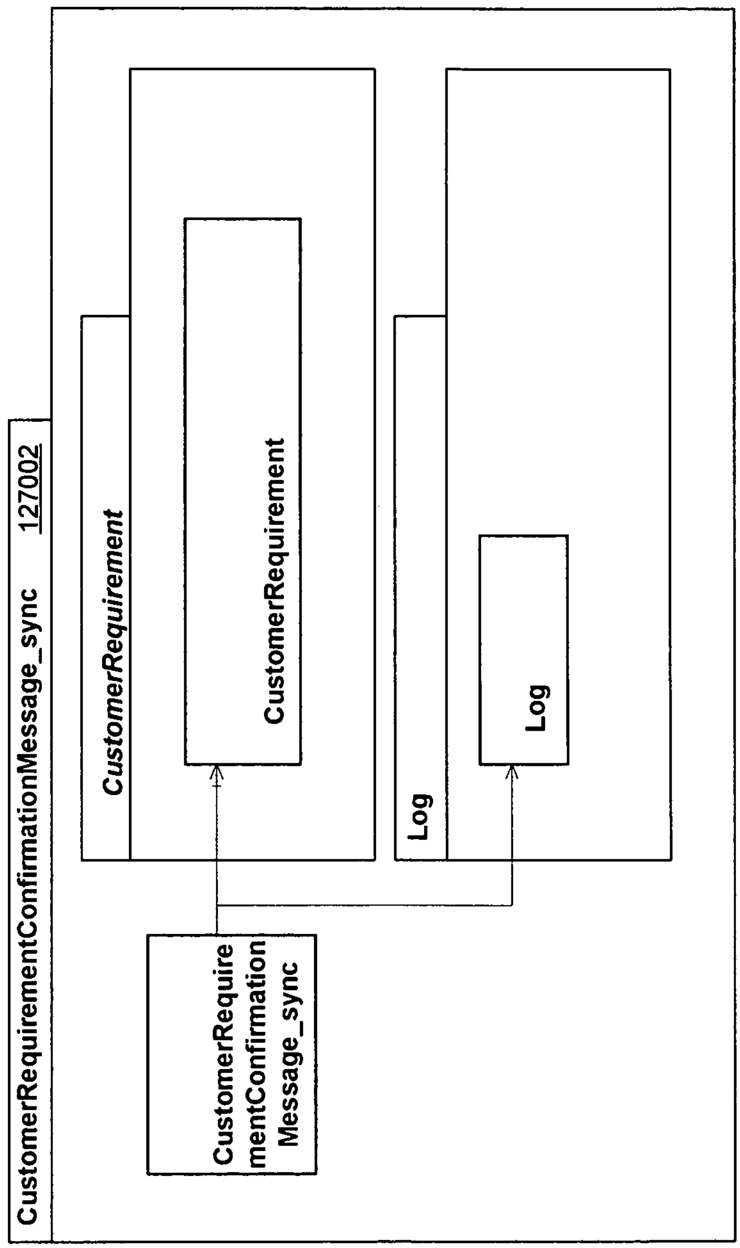
Figures 1, 128:
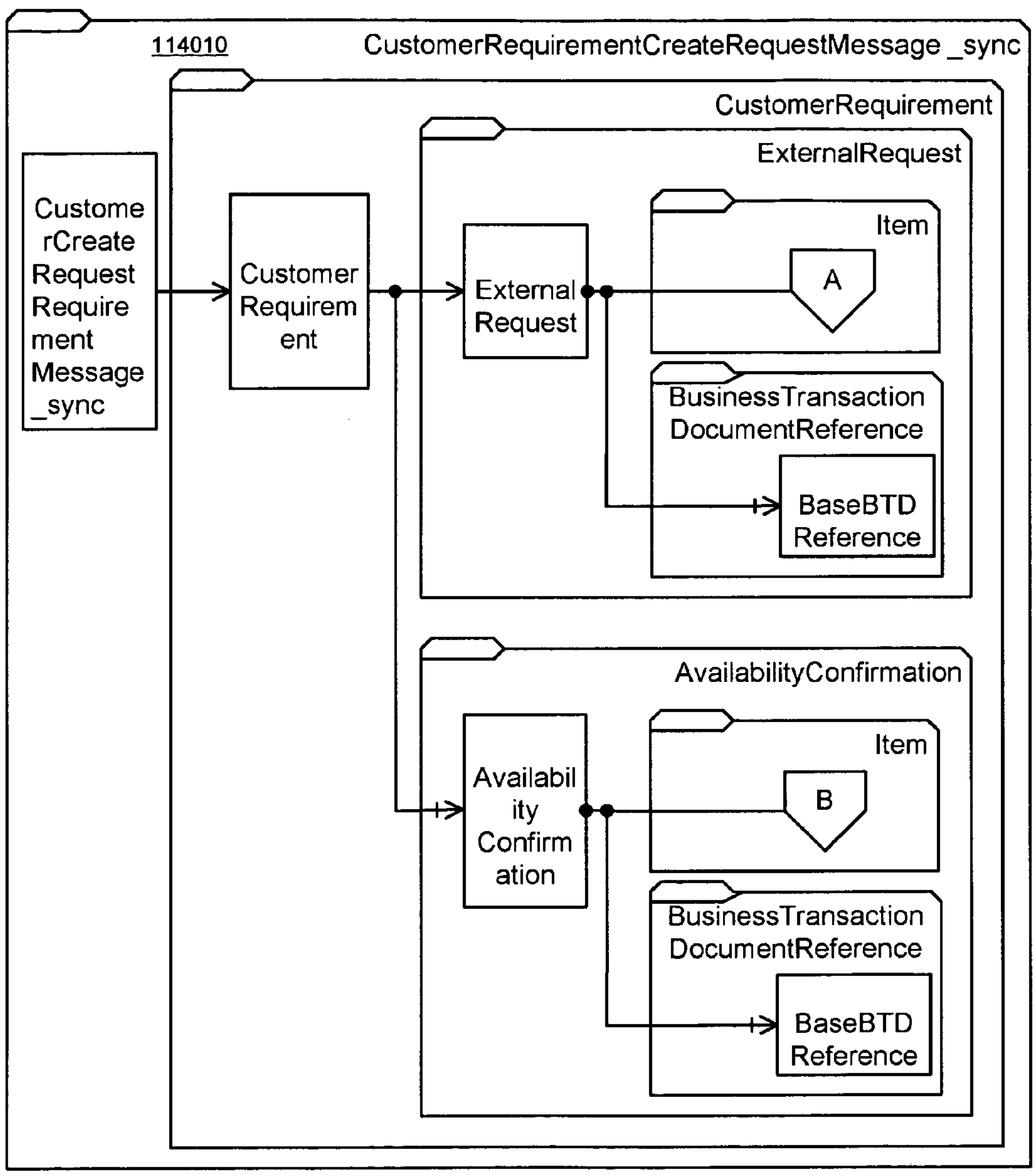
Figures 2, 128:
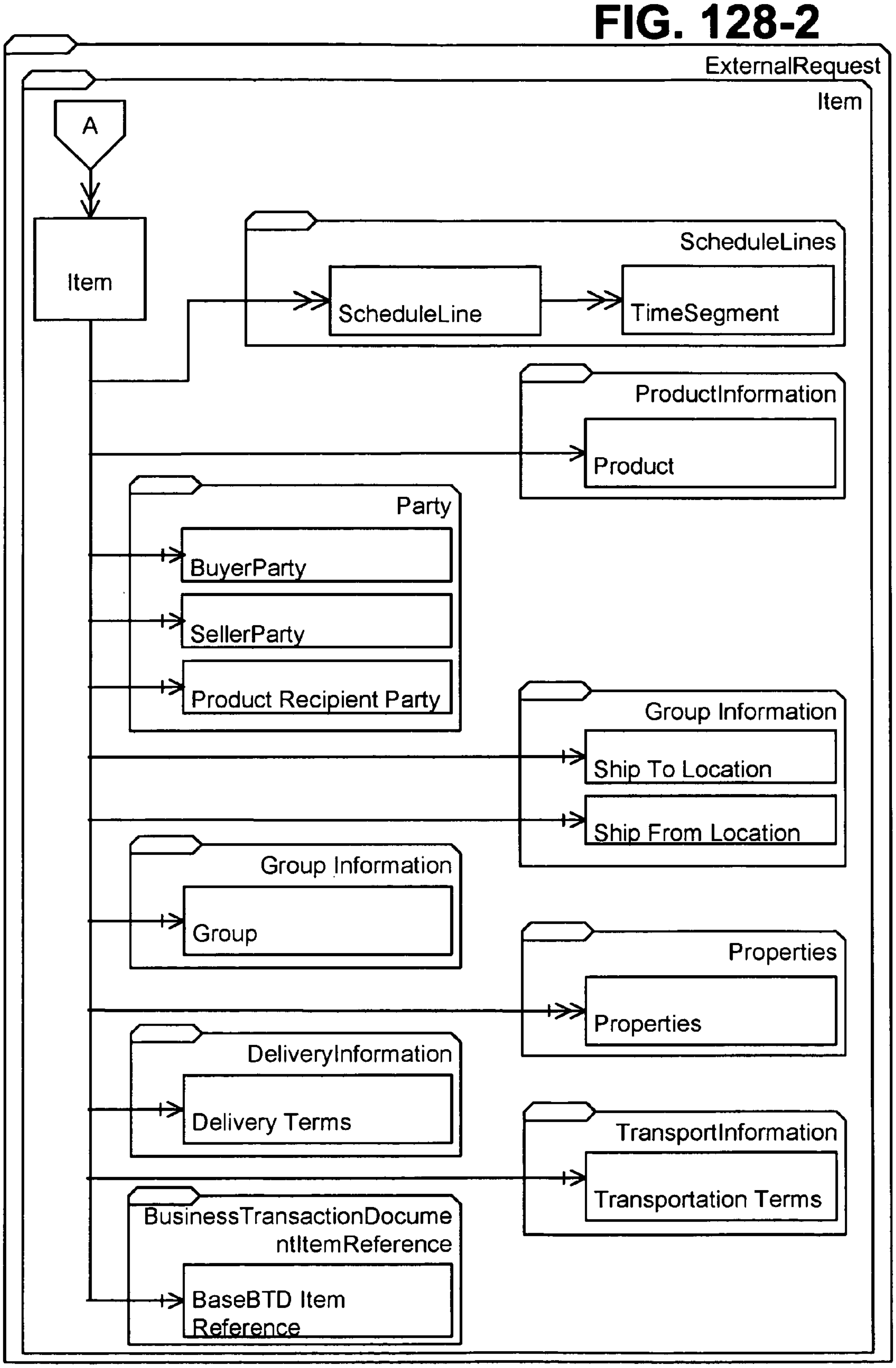
Figures 3, 128:
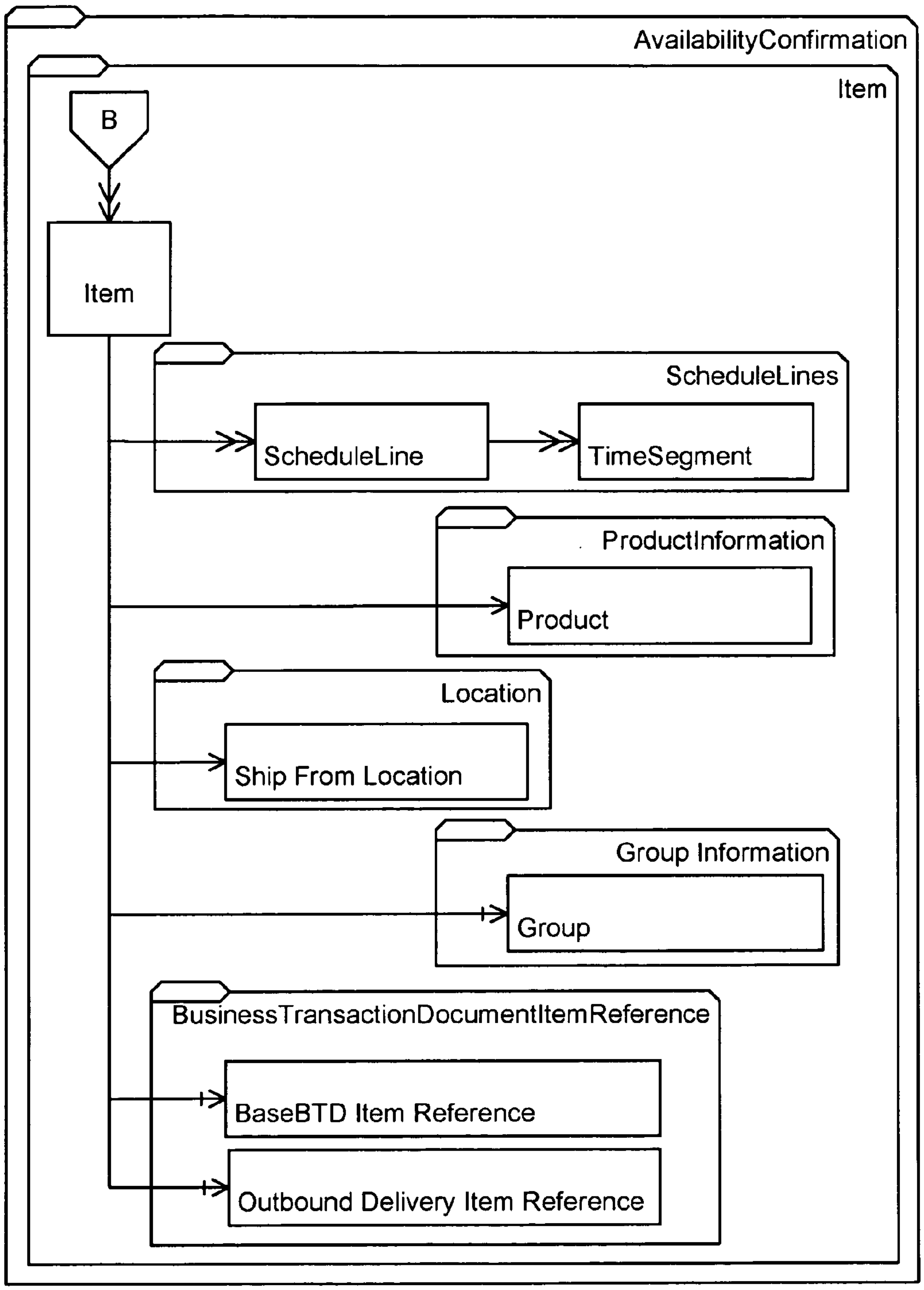
Figure 129:
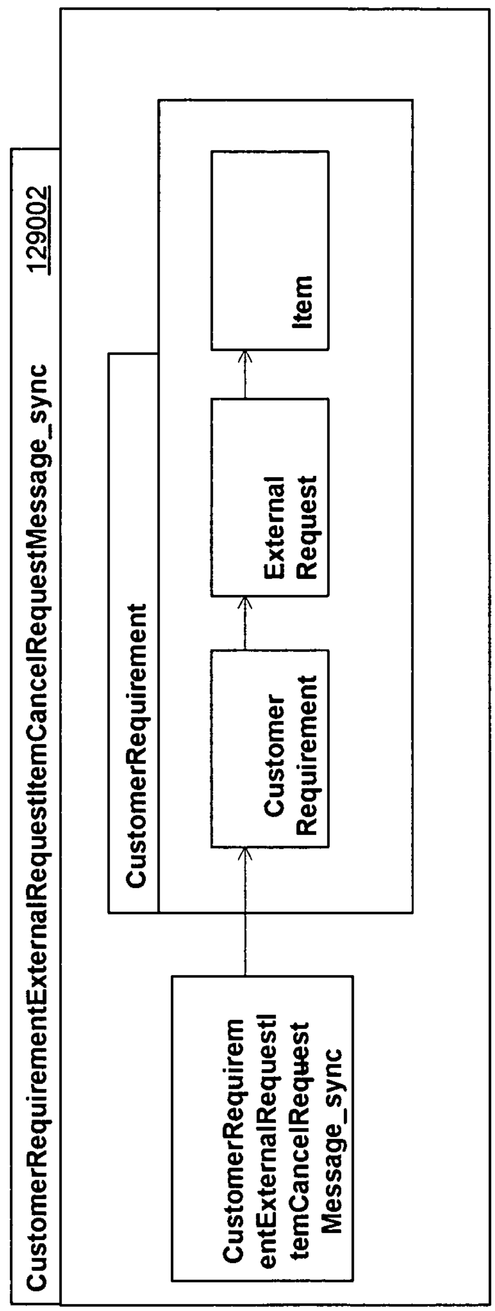

FIG. 114 shows a message choreography where an "Availability Check Consumer" system 114002 first executes an availability check using the ProductAvailabilityRequirementCheckAndReserveQuery message 114006 transmitted to a "Customer Requirement Processing" system 114004. Its results can then be converted into the customer requirement and stored in the "Customer Requirement Processing" system 114004. The "Customer Requirement Processing" system 114004 can respond to the query using the ProductAvailabilityRequirementCheckAndReserveResponse message 114008. The "Availability Check Consumer" system 114002 can request to create a customer requirement using the CustomerRequirementCreateRequest message 114010 as shown, for example, in FIGS. 128-1 through 128-3. The "Customer Requirement Processing System" 114004 can confirm the request using the CustomerRequirementCreateConfirmation message 114012 as shown, for example, in FIG. 127. The "Availability Check Consumer" system 114002 can query a customer requirement using the CustomerRequirementByIDQuery message 114014 as shown, for example, in FIG. 123. The "Customer Requirement Processing System" 114004 can respond to the query using the CustomerRequirementByIDResponse message 114016 as shown, for example, in FIGS. 124-1 through 124-3.

FIG. 116 shows message choreography where additionally a "Sales Order Processing" system 116006 is involved. An "Availability Check Consumer" system 116002 first executes an availability check using the ProductAvailabilityRequirementCheckAndReserveQuery message 116020 transmitted to a "Customer Requirement Processing" system 116004. Its results are then stored as a sales order in the "Sales Order Processing" system 116006. After the sales order is stored, the "Availability Check Consumer" system 116002 also stores the availability check results as a customer requirement in the "Customer Requirement Processing" system 116004. The "Customer Requirement Processing" system 116004 can respond to the query using the ProductAvailabilityRequirementCheckAndReserveResponse message 116010. The "Availability Check Consumer" system 116002 can request the creation of a sales order using the CreateSalesOrderRequest message 116016. The "Customer Requirement Processing" system 116004 can respond to the request using the CreateSalesOrderConfirmation message 116014. The "Availability Check Consumer" system 116002 can request to create a customer requirement using the CustomerRequirementCreateRequest message 116012. The "Customer Requirement Processing" system 116004 can respond to the request using the CustomerRequirementCreateConfirmation message 116018. The "Availability Check Consumer" system 116002 can query a customer requirement using the CustomerRequirementByIDQuery message 116008. The "Customer Requirement Processing" system 116004 can respond to the query using the CustomerRequirementByIDResponse message 116022.

FIG. 115 shows a message choreography where an "Availability Check Consumer" system 115002 first executes an availability check using the ProductAvailabilityRequirementCheckAndReserveQuery message 115006 transmitted to a "Customer Requirement Processing" system 115004. Its results do not contain a confirmation, so the results are then converted into the customer requirement external request item and stored the "Customer Requirement Processing" system 115004. The "Customer Requirement Processing" system 115004 can respond to the query using the ProductAvailabilityRequirementCheckAndReserveResponse message 115008. The "Availability Check Consumer" system 115002 can request to create a customer requirement using the CustomerRequirementExternalRequestItemCreateRequest message 115010 as shown, for example, in FIG. 132. The "Customer Requirement Processing" system 115004 can confirm the request using the CustomerRequirementExternalRequestItemCreateConfirmation message 115012 as shown, for example, in FIG. 131. The "Availability Check Consumer" system 115002 can query a customer requirement using the CustomerRequirementByIDAndItemIDQuery message 115014. The "Customer Requirement Processing" system 115004 can respond to the query using the CustomerRequirementByIDAndItemIDResponse message 115016.

Message Data Type

The CustomerRequirement package groups the entity CustomerRequirement with its packages. The external request is a requirement containing the quantities required of specific products as well as the dates at which they are required. The availability confirmation is a confirmation of the available quantities of the products or suitable substitute products, the location in which they are available as well as the dates at which they are available. FIGS. 144-1 through 144-21 show a CustomerRequirementCreateRequestMessage_sync 144000 package. The CustomerRequirementCreateRequestMessage_sync 144000 package is a CustomerRequirementCreateRequestMessage_sync 144004 datatype. The CustomerRequirementCreateRequestMessage_sync 144000 package includes a CustomerRequirementCreateRequestMessage_sync 144002 entity. The CustomerRequirementCreateRequestMessage_sync 144000 package includes a CustomerRequirement 144006 package.

The CustomerRequirement 144006 package includes a CustomerRequirement 144008 entity. The CustomerRequirement 144006 package includes various packages, namely ExternalRequest 144024 and AvailabilityConfirmation 1440360.

The CustomerRequirement 144008 entity has a cardinality of one 144010 meaning that for each instance of the CustomerRequirementCreateRequestMessage_sync 144002 entity there is one CustomerRequirement 144008 entity. The CustomerRequirement 144008 entity includes various attributes, namely ID 144012 and SystemAdministrativeData 144018.

The ID 144012 attribute is a BusinessTransactionDocumentID 144016 datatype. The ID 144012 attribute has a cardinality of one 144014 meaning that for each instance of the CustomerRequirement 144008 entity there is one ID 144012 attribute.

The SystemAdministrativeData 144018 attribute is a SystemAdministrativeData 144022 datatype. The SystemAdministrativeData 144018 attribute has a cardinality of one 144020 meaning that for each instance of the CustomerRequirement 144008 entity there is one SystemAdministrativeData 144018 attribute.

The ExternalRequest 144024 package includes an ExternalRequest 144026 entity. The ExternalRequest 144024 package includes various packages, namely BusinessTransactionDocumentReference 144038 and Item 144052.

The ExternalRequest 144026 entity has a cardinality of one 144028 meaning that for each instance of the CustomerRequirement 144008 entity there is one ExternalRequest 144026 entity. The ExternalRequest 144026 entity includes a BaseBusinessTransactionDocumentTypeCode 144032 attribute.

The BaseBusinessTransactionDocumentTypeCode 144032 attribute is a BusinessTransactionDocumentTypeCode 144036 datatype. The BaseBusinessTransactionDocumentTypeCode 144032 attribute has a cardinality of one 144034 meaning that for each instance of the ExternalRequest 144026 entity there is one BaseBusinessTransactionDocumentTypeCode 144032 attribute.

The BusinessTransactionDocumentReference 144038 package includes a BaseBusinessTransactionDocumentReference 144040 entity.

The BaseBusinessTransactionDocumentReference 144040 entity has a cardinality of zero or one 144042 meaning that for each instance of the ExternalRequest 144026 entity there may be one BaseBusinessTransactionDocumentReference 144040 entity. The BaseBusinessTransactionDocumentReference 144040 entity includes an ID 144046 attribute.

The ID 144046 attribute is a BusinessTransactionDocumentID 144050 datatype. The ID 144046 attribute has a cardinality of one 144048 meaning that for each instance of the BaseBusinessTransactionDocumentReference 144040 entity there is one ID 144046 attribute.

The Item 144052 package includes an Item 144054 entity. The Item 144052 package includes various packages, namely ProductInformation 1440108, Party 1440140, Location 1440178, GroupInformation 1440216, Properties 1440236, DeliveryInformation 1440256, Transportation 1440294, BusinessTransactionDocumentItemReference 1440308 and ScheduleLine 1440322.

The Item 144054 entity has a cardinality of one or n 144056 meaning that for each instance of the ExternalRequest 144026 entity there are one or more Item 144054 entities. The Item 144054 entity includes various attributes, namely ProductAvailabilityRequirementConfirmationItemUUID 144060, ID 144066, SupplyPlanningAreaID 144072, BaseBusinessTransactionDocumentItemTypeCode 144078, DistributionChannelCode 144084, DivisionCode 144090, LogisticsExecutionBlockingReasonCode 144096 and CancellationReasonCode 1440102.

The ProductAvailabilityRequirementConfirmationItemUUID 144060 attribute is an UUID 144064 datatype. The ProductAvailabilityRequirementConfirmationItemUUID 144060 attribute has a cardinality of zero or one 144062 meaning that for each instance of the Item 144054 entity there may be one ProductAvailabilityRequirementConfirmationItemUUID 144060 attribute.

The ID 144066 attribute is a BusinessTransactionDocumentItemID 144070 datatype. The ID 144066 attribute has a cardinality of one 144068 meaning that for each instance of the Item 144054 entity there is one ID 144066 attribute.

The SupplyPlanningAreaID 144072 attribute is a SupplyPlanningAreaID 144076 datatype. The SupplyPlanningAreaID 144072 attribute has a cardinality of zero or one 144074 meaning that for each instance of the Item 144054 entity there may be one SupplyPlanningAreaID 144072 attribute.

The BaseBusinessTransactionDocumentItemTypeCode 144078 attribute is a BusinessTransactionDocumentItemTypeCode 144082 datatype. The BaseBusinessTransactionDocumentItemTypeCode 144078 attribute has a cardinality of zero or one 144080 meaning that for each instance of the Item 144054 entity there may be one BaseBusinessTransactionDocumentItemTypeCode 144078 attribute.

The DistributionChannelCode 144084 attribute is a DistributionChannelCode 144088 datatype. The DistributionChannelCode 144084 attribute has a cardinality of zero or one 144086 meaning that for each instance of the Item 144054 entity there may be one DistributionChannelCode 144084 attribute.

The DivisionCode 144090 attribute is a DivisionCode 144094 datatype. The DivisionCode 144090 attribute has a cardinality of zero or one 144092 meaning that for each instance of the Item 144054 entity there may be one DivisionCode 144090 attribute.

The LogisticsExecutionBlockingReasonCode 144096 attribute is a BlockingReasonCode 1440100 datatype. The LogisticsExecutionBlockingReasonCode 144096 attribute has a cardinality of zero or one 144098 meaning that for each instance of the Item 144054 entity there may be one LogisticsExecutionBlockingReasonCode 144096 attribute.

The CancellationReasonCode 1440102 attribute is a CancellationReasonCode 1440106 datatype. The CancellationReasonCode 1440102 attribute has a cardinality of zero or one 1440104 meaning that for each instance of the Item 144054 entity there may be one CancellationReasonCode 1440102 attribute.

The ProductInformation 1440108 package includes a Product 1440110 entity.

The Product 1440110 entity has a cardinality of one 1440112 meaning that for each instance of the Item 144054 entity there is one Product 1440110 entity. The Product 1440110 entity includes various attributes, namely InternalID 1440116, SellerID 1440122, BuyerID 1440128 and IdentifiedStockID 1440134.

The InternalID 1440116 attribute is a ProductInternalID 1440120 datatype. The InternalID 1440116 attribute has a cardinality of one 1440118 meaning that for each instance of the Product 1440110 entity there is one InternalID 1440116 attribute.

The SellerID 1440122 attribute is a ProductPartyID 1440126 datatype. The SellerID 1440122 attribute has a cardinality of zero or one 1440124 meaning that for each instance of the Product 1440110 entity there may be one SellerID 1440122 attribute.

The BuyerID 1440128 attribute is a ProductPartyID 1440132 datatype. The BuyerID 1440128 attribute has a cardinality of zero or one 1440130 meaning that for each instance of the Product 1440110 entity there may be one BuyerID 1440128 attribute.

The IdentifiedStockID 1440134 attribute is an IdentifiedStockID 1440138 datatype. The IdentifiedStockID 1440134 attribute has a cardinality of zero or one 1440136 meaning that for each instance of the Product 1440110 entity there may be one IdentifiedStockID 1440134 attribute.

The Party 1440140 package includes various entities, namely BuyerParty 1440142, SellerParty 1440154 and ProductRecipientParty 1440166.

The BuyerParty 1440142 entity has a cardinality of zero or one 1440144 meaning that for each instance of the Item 144054 entity there may be one BuyerParty 1440142 entity. The BuyerParty 1440142 entity includes an ID 1440148 attribute.

The ID 1440148 attribute is a PartyID 1440152 datatype. The ID 1440148 attribute has a cardinality of one 1440150 meaning that for each instance of the BuyerParty 1440142 entity there is one ID 1440148 attribute.

The SellerParty 1440154 entity has a cardinality of zero or one 1440156 meaning that for each instance of the Item 144054 entity there may be one SellerParty 1440154 entity. The SellerParty 1440154 entity includes an ID 1440160 attribute.

The ID 1440160 attribute is a PartyID 1440164 datatype. The ID 1440160 attribute has a cardinality of one 1440162 meaning that for each instance of the SellerParty 1440154 entity there is one ID 1440160 attribute.

The ProductRecipientParty 1440166 entity has a cardinality of zero or one 1440168 meaning that for each instance of the Item 144054 entity there may be one ProductRecipientParty 1440166 entity. The ProductRecipientParty 1440166 entity includes an ID 1440172 attribute.

The ID 1440172 attribute is a PartyID 1440176 datatype. The ID 1440172 attribute has a cardinality of one 1440174 meaning that for each instance of the ProductRecipientParty 1440166 entity there is one ID 1440172 attribute.

The Location 1440178 package includes various entities, namely ShipToLocation 1440180 and ShipFromLocation 1440198.

The ShipToLocation 1440180 entity has a cardinality of zero or one 1440182 meaning that for each instance of the Item 144054 entity there may be one ShipToLocation 1440180 entity. The ShipToLocation 1440180 entity includes various attributes, namely BuyerID 1440186 and SellerID 1440192.

The BuyerID 1440186 attribute is a LocationPartyID 1440190 datatype. The BuyerID 1440186 attribute has a cardinality of zero or one 1440188 meaning that for each instance of the ShipToLocation 1440180 entity there may be one BuyerID 1440186 attribute.

The SellerID 1440192 attribute is a LocationPartyID 1440196 datatype. The SellerID 1440192 attribute has a cardinality of zero or one 1440194 meaning that for each instance of the ShipToLocation 1440180 entity there may be one SellerID 1440192 attribute.

The ShipFromLocation 1440198 entity has a cardinality of zero or one 1440200 meaning that for each instance of the Item 144054 entity there may be one ShipFromLocation 1440198 entity. The ShipFromLocation 1440198 entity includes various attributes, namely BuyerID 1440204 and SellerID 1440210.

The BuyerID 1440204 attribute is a LocationPartyID 1440208 datatype. The BuyerID 1440204 attribute has a cardinality of zero or one 1440206 meaning that for each instance of the ShipFromLocation 1440198 entity there may be one BuyerID 1440204 attribute.

The SellerID 1440210 attribute is a LocationPartyID 1440214 datatype. The SellerID 1440210 attribute has a cardinality of zero or one 1440212 meaning that for each instance of the ShipFromLocation 1440198 entity there may be one SellerID 1440210 attribute.

The GroupInformation 1440216 package includes a Group 1440218 entity.

The Group 1440218 entity has a cardinality of zero or one 1440220 meaning that for each instance of the Item 144054 entity there may be one Group 1440218 entity. The Group 1440218 entity includes various attributes, namely ID 1440224 and HierarchyRelationshipTypeCode 1440230.

The ID 1440224 attribute is a BusinessTransactionDocumentItemGroupID 1440228 datatype. The ID 1440224 attribute has a cardinality of one 1440226 meaning that for each instance of the Group 1440218 entity there is one ID 1440224 attribute.

The HierarchyRelationshipTypeCode 1440230 attribute is a BusinessTransactionDocumentItemHierarchyRelationshipTypeCode 1440234 datatype. The HierarchyRelationshipTypeCode 1440230 attribute has a cardinality of zero or one 1440232 meaning that for each instance of the Group 1440218 entity there may be one HierarchyRelationshipTypeCode 1440230 attribute.

The Properties 1440236 package includes a Property 1440238 entity.

The Property 1440238 entity has a cardinality of zero or n 1440240 meaning that for each instance of the Item 144054 entity there may be one or more Property 1440238 entities. The Property 1440238 entity includes various attributes, namely ID 1440244 and Value 1440250.

The ID 1440244 attribute is a PropertyID 1440248 datatype. The ID 1440244 attribute has a cardinality of one 1440246 meaning that for each instance of the Property 1440238 entity there is one ID 1440244 attribute.

The Value 1440250 attribute is a PropertyValue 1440254 datatype. The Value 1440250 attribute has a cardinality of one 1440252 meaning that for each instance of the Property 1440238 entity there is one Value 1440250 attribute.

The DeliveryInformation 1440256 package includes a DeliveryTerms 1440258 entity.

The DeliveryTerms 1440258 entity has a cardinality of zero or one 1440260 meaning that for each instance of the Item 144054 entity there may be one DeliveryTerms 1440258 entity. The DeliveryTerms 1440258 entity includes various attributes, namely PriorityCode 1440264, Incoterms 1440270, PartialDeliveryMaximumNumberValue 1440276, QuantityTolerance 1440282 and PartialDeliveryControlCode 1440288.

The PriorityCode 1440264 attribute is a PriorityCode 1440268 datatype. The PriorityCode 1440264 attribute has a cardinality of zero or one 1440266 meaning that for each instance of the DeliveryTerms 1440258 entity there may be one PriorityCode 1440264 attribute.

The Incoterms 1440270 attribute is an Incoterms 1440274 datatype. The Incoterms 1440270 attribute has a cardinality of zero or one 1440272 meaning that for each instance of the DeliveryTerms 1440258 entity there may be one Incoterms 1440270 attribute.

The PartialDeliveryMaximumNumberValue 1440276 attribute is a NumberValue 1440280 datatype. The PartialDeliveryMaximumNumberValue 1440276 attribute has a cardinality of zero or one 1440278 meaning that for each instance of the DeliveryTerms 1440258 entity there may be one PartialDeliveryMaximumNumberValue 1440276 attribute.

The QuantityTolerance 1440282 attribute is a QuantityTolerance 1440286 datatype. The QuantityTolerance 1440282 attribute has a cardinality of zero or one 1440284 meaning that for each instance of the DeliveryTerms 1440258 entity there may be one QuantityTolerance 1440282 attribute.

The PartialDeliveryControlCode 1440288 attribute is a PartialDeliveryControlCode 1440292 datatype. The PartialDeliveryControlCode 1440288 attribute has a cardinality of zero or one 1440290 meaning that for each instance of the DeliveryTerms 1440258 entity there may be one PartialDeliveryControlCode 1440288 attribute.

The Transportation 1440294 package includes a TransportationTerms 1440296 entity.

The TransportationTerms 1440296 entity has a cardinality of zero or one 1440298 meaning that for each instance of the Item 144054 entity there may be one TransportationTerms 1440296 entity. The TransportationTerms 1440296 entity includes a TransportServiceLevelCode 1440302 attribute.

The TransportServiceLevelCode 1440302 attribute is a TransportServiceLevelCode 1440306 datatype. The TransportServiceLevelCode 1440302 attribute has a cardinality of zero or one 1440304 meaning that for each instance of the TransportationTerms 1440296 entity there may be one TransportServiceLevelCode 1440302 attribute.

The BusinessTransactionDocumentItemReference 1440308 package includes a BaseBusinessTransactionDocumentItemReference 1440310 entity.

The BaseBusinessTransactionDocumentItemReference 1440310 entity has a cardinality of zero or one 1440312 meaning that for each instance of the Item 144054 entity there may be one BaseBusinessTransactionDocumentItemReference 1440310 entity. The BaseBusinessTransactionDocumentItemReference 1440310 entity includes a BusinessTransactionDocumentItemReference 1440316 attribute.

The BusinessTransactionDocumentItemReference 1440316 attribute is a BusinessTransactionDocumentReference 1440320 datatype. The BusinessTransactionDocumentItemReference 1440316 attribute has a cardinality of one 1440318 meaning that for each instance of the BaseBusinessTransactionDocumentItemReference 1440310 entity there is one BusinessTransactionDocumentItemReference 1440316 attribute.

The ScheduleLine 1440322 package includes a ScheduleLine 1440324 entity.

The ScheduleLine 1440324 entity has a cardinality of one or n 1440326 meaning that for each instance of the Item 144054 entity there are one or more ScheduleLine 1440324 entities. The ScheduleLine 1440324 entity includes various attributes, namely ID 1440330 and Quantity 1440336. The ScheduleLine 1440324 entity includes a TimeSegment 1440342 subordinate entity.

The ID 1440330 attribute is a BusinessTransactionDocumentItemScheduleLineID 1440334 datatype. The ID 1440330 attribute has a cardinality of one 1440332 meaning that for each instance of the ScheduleLine 1440324 entity there is one ID 1440330 attribute.

The Quantity 1440336 attribute is a Quantity 1440340 datatype. The Quantity 1440336 attribute has a cardinality of one 1440338 meaning that for each instance of the ScheduleLine 1440324 entity there is one Quantity 1440336 attribute.

The TimeSegment 1440342 entity has a cardinality of one or n 1440344 meaning that for each instance of the ScheduleLine 1440324 entity there are one or more TimeSegment 1440342 entities. The TimeSegment 1440342 entity includes various attributes, namely DateTimePeriod 1440348 and PeriodRoleCode 1440354.

The DateTimePeriod 1440348 attribute is an UPPEROPEN_GLOBAL_DateTimePeriod 1440352 datatype. The DateTimePeriod 1440348 attribute has a cardinality of one 1440350 meaning that for each instance of the TimeSegment 1440342 entity there is one DateTimePeriod 1440348 attribute.

The PeriodRoleCode 1440354 attribute is a PeriodRoleCode 1440358 datatype. The PeriodRoleCode 1440354 attribute has a cardinality of one 1440356 meaning that for each instance of the TimeSegment 1440342 entity there is one PeriodRoleCode 1440354 attribute.

The AvailabilityConfirmation 1440360 package includes an AvailabilityConfirmation 1440362 entity. The AvailabilityConfirmation 1440360 package includes various packages, namely BusinessTransactionDocumentReference 1440374 and Item 1440388.

The AvailabilityConfirmation 1440362 entity has a cardinality of zero or one 1440364 meaning that for each instance of the CustomerRequirement 144008 entity there may be one AvailabilityConfirmation 1440362 entity. The AvailabilityConfirmation 1440362 entity includes a BaseBusinessTransactionDocumentTypeCode 1440368 attribute.

The BaseBusinessTransactionDocumentTypeCode 1440368 attribute is a BusinessTransactionDocumentTypeCode 1440372 datatype. The BaseBusinessTransactionDocumentTypeCode 1440368 attribute has a cardinality of one 1440370 meaning that for each instance of the AvailabilityConfirmation 1440362 entity there is one BaseBusinessTransactionDocumentTypeCode 1440368 attribute.

The BusinessTransactionDocumentReference 1440374 package includes a BaseBusinessTransactionDocumentReference 1440376 entity.

The BaseBusinessTransactionDocumentReference 1440376 entity has a cardinality of zero or one 1440378 meaning that for each instance of the AvailabilityConfirmation 1440362 entity there may be one BaseBusinessTransactionDocumentReference 1440376 entity. The BaseBusinessTransactionDocumentReference 1440376 entity includes an ID 1440382 attribute.

The ID 1440382 attribute is a BusinessTransactionDocumentID 1440386 datatype. The ID 1440382 attribute has a cardinality of one 1440384 meaning that for each instance of the BaseBusinessTransactionDocumentReference 1440376 entity there is one ID 1440382 attribute.

The Item 1440388 package includes an Item 1440390 entity. The Item 1440388 package includes various packages, namely ProductInformation 1440432, Location 1440464, GroupInformation 1440484, BusinessTransactionDocumentItemReference 1440504 and ScheduleLine 1440530.

The Item 1440390 entity has a cardinality of one or n 1440392 meaning that for each instance of the AvailabilityConfirmation 1440362 entity there are one or more Item 1440390 entities. The Item 1440390 entity includes various attributes, namely ProductAvailabilityRequirementConfirmationItemUUID 1440396, ID 1440402, BaseBusinessTransactionDocumentItemTypeCode 1440408, SystemAdministrativeData 1440414, SupplyPlanningAreaID 1440420 and ExternalRequestItemUUID 1440426.

The ProductAvailabilityRequirementConfirmationItemUUID 1440396 attribute is an UUID 1440400 datatype. The ProductAvailabilityRequirementConfirmationItemUUID 1440396 attribute has a cardinality of zero or one 1440398 meaning that for each instance of the Item 1440390 entity there may be one ProductAvailabilityRequirementConfirmationItemUUID 1440396 attribute.

The ID 1440402 attribute is a BusinessTransactionDocumentItemID 1440406 datatype. The ID 1440402 attribute has a cardinality of one 1440404 meaning that for each instance of the Item 1440390 entity there is one ID 1440402 attribute.

The BaseBusinessTransactionDocumentItemTypeCode 1440408 attribute is a BusinessTransactionDocumentItemTypeCode 1440412 datatype. The BaseBusinessTransactionDocumentItemTypeCode 1440408 attribute has a cardinality of zero or one 1440410 meaning that for each instance of the Item 1440390 entity there may be one BaseBusinessTransactionDocumentItemTypeCode 1440408 attribute.

The SystemAdministrativeData 1440414 attribute is a SystemAdministrativeData 1440418 datatype. The SystemAdministrativeData 1440414 attribute has a cardinality of one 1440416 meaning that for each instance of the Item 1440390 entity there is one SystemAdministrativeData 1440414 attribute.

The SupplyPlanningAreaID 1440420 attribute is a SupplyPlanningAreaID 1440424 datatype. The SupplyPlanningAreaID 1440420 attribute has a cardinality of zero or one 1440422 meaning that for each instance of the Item 1440390 entity there may be one SupplyPlanningAreaID 1440420 attribute.

The ExternalRequestItemUUID 1440426 attribute is an UUID 1440430 datatype. The ExternalRequestItemUUID 1440426 attribute has a cardinality of one 1440428 meaning that for each instance of the Item 1440390 entity there is one ExternalRequestItemUUID 440426 attribute.

The ProductInformation 1440432 package includes a Product 1440434 entity.

The Product 1440434 entity has a cardinality of one 1440436 meaning that for each instance of the Item 1440390 entity there is one Product 1440434 entity. The Product 1440434 entity includes various attributes, namely InternalID 1440440, SellerID 1440446, BuyerID 1440452 and IdentifiedStockID 1440458.

The InternalID 1440440 attribute is a ProductInternalID 1440444 datatype. The InternalID 1440440 attribute has a cardinality of one 1440442 meaning that for each instance of the Product 1440434 entity there is one InternalID 1440440 attribute.

The SellerID 1440446 attribute is a ProductPartyID 1440450 datatype. The SellerID 1440446 attribute has a cardinality of zero or one 1440448 meaning that for each instance of the Product 1440434 entity there may be one SellerID 1440446 attribute.

The BuyerID 1440452 attribute is a ProductPartyID 1440456 datatype. The BuyerID 1440452 attribute has a cardinality of zero or one 1440454 meaning that for each instance of the Product 1440434 entity there may be one BuyerID 1440452 attribute.

The IdentifiedStockID 1440458 attribute is an IdentifiedStockID 1440462 datatype. The IdentifiedStockID 1440458 attribute has a cardinality of zero or one 1440460 meaning that for each instance of the Product 1440434 entity there may be one IdentifiedStockID 1440458 attribute.

The Location 1440464 package includes a ShipFromLocation 1440466 entity.

The ShipFromLocation 1440466 entity has a cardinality of one 1440468 meaning that for each instance of the Item 1440390 entity there is one ShipFromLocation 1440466 entity. The ShipFromLocation 1440466 entity includes various attributes, namely BuyerID 1440472 and SellerID 1440478.

The BuyerID 1440472 attribute is a LocationPartyID 1440476 datatype. The BuyerID 1440472 attribute has a cardinality of zero or one 1440474 meaning that for each instance of the ShipFromLocation 1440466 entity there may be one BuyerID 1440472 attribute.

The SellerID 1440478 attribute is a LocationPartyID 1440482 datatype. The SellerID 1440478 attribute has a cardinality of zero or one 1440480 meaning that for each instance of the ShipFromLocation 1440466 entity there may be one SellerID 1440478 attribute.

The GroupInformation 1440484 package includes a Group 1440486 entity.

The Group 1440486 entity has a cardinality of zero or one 1440488 meaning that for each instance of the Item 1440390 entity there may be one Group 1440486 entity. The Group 1440486 entity includes various attributes, namely ID 1440492 and HierarchyRelationshipTypeCode 1440498.

The ID 1440492 attribute is a BusinessTransactionDocumentItemGroupID 1440496 datatype. The ID 1440492 attribute has a cardinality of one 1440494 meaning that for each instance of the Group 1440486 entity there is one ID 1440492 attribute.

The HierarchyRelationshipTypeCode 1440498 attribute is a BusinessTransactionDocumentItemHierarchyRelationshipTypeCode 1440502 datatype. The HierarchyRelationshipTypeCode 1440498 attribute has a cardinality of zero or one 1440500 meaning that for each instance of the Group 1440486 entity there may be one HierarchyRelationshipTypeCode 1440498 attribute.

The BusinessTransactionDocumentItemReference 1440504 package includes various entities, namely BaseBusinessTransactionDocumentItemReference 1440506 and OutboundDeliveryReference 1440518.

The BaseBusinessTransactionDocumentItemReference 1440506 entity has a cardinality of zero or one 1440508 meaning that for each instance of the Item 1440390 entity there may be one BaseBusinessTransactionDocumentItemReference 1440506 entity. The BaseBusinessTransactionDocumentItemReference 1440506 entity includes a BusinessTransactionDocumentItemReference 1440512 attribute.

The BusinessTransactionDocumentItemReference 1440512 attribute is a BusinessTransactionDocumentReference 1440516 datatype. The BusinessTransactionDocumentItemReference 1440512 attribute has a cardinality of one 1440514 meaning that for each instance of the BaseBusinessTransactionDocumentItemReference 1440506 entity there is one BusinessTransactionDocumentItemReference 1440512 attribute.

The OutboundDeliveryReference 1440518 entity has a cardinality of zero or one 1440520 meaning that for each instance of the Item 1440390 entity there may be one OutboundDeliveryReference 1440518 entity. The OutboundDeliveryReference 1440518 entity includes a BusinessTransactionDocumentItemReference 1440524 attribute.

The BusinessTransactionDocumentItemReference 1440524 attribute is a BusinessTransactionDocumentReference 1440528 datatype. The BusinessTransactionDocumentItemReference 1440524 attribute has a cardinality of one 1440526 meaning that for each instance of the OutboundDeliveryReference 1440518 entity there is one BusinessTransactionDocumentItemReference 1440524 attribute.

The ScheduleLine 1440530 package includes a ScheduleLine 1440532 entity.

The ScheduleLine 1440532 entity has a cardinality of one or n 1440534 meaning that for each instance of the Item 1440390 entity there are one or more ScheduleLine 1440532 entities. The ScheduleLine 1440532 entity includes various attributes, namely ID 1440538 and Quantity 1440544. The ScheduleLine 1440532 entity includes a TimeSegment 1440550 subordinate entity.

The ID 1440538 attribute is a BusinessTransactionDocumentItemScheduleLineID 1440542 datatype. The ID 1440538 attribute has a cardinality of one 1440540 meaning that for each instance of the ScheduleLine 1440532 entity there is one ID 1440538 attribute.

The Quantity 1440544 attribute is a Quantity 1440548 datatype. The Quantity 1440544 attribute has a cardinality of one 1440546 meaning that for each instance of the ScheduleLine 1440532 entity there is one Quantity 1440544 attribute.

The TimeSegment 1440550 entity has a cardinality of one or n 1440552 meaning that for each instance of the ScheduleLine 1440532 entity there are one or more TimeSegment 1440550 entities. The TimeSegment 1440550 entity includes various attributes, namely DateTimePeriod 1440556 and PeriodRoleCode 1440562.

The DateTimePeriod 1440556 attribute is an UPPEROPEN_GLOBAL_DateTimePeriod 1440560 datatype. The DateTimePeriod 1440556 attribute has a cardinality of one 1440558 meaning that for each instance of the TimeSegment 1440550 entity there is one DateTimePeriod 1440556 attribute.

The PeriodRoleCode 1440562 attribute is a PeriodRoleCode 1440566 datatype. The PeriodRoleCode 1440562 attribute has a cardinality of one 1440564 meaning that for each instance of the TimeSegment 1440550 entity there is one PeriodRoleCode 1440562 attribute.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. The ID is the unique identifier of a CustomerRequirement. SystemAdministrativeData is administrative data that is stored in the system that describes who created or changed the customer requirement and when.

ExternalRequest Package

The ExternalRequest package groups the entity ExternalRequest with its packages. BusinessTransactionDocumentReference contains the reference to a related business transaction document. Item contains all the item related data of an ExternalRequest.

ExternalRequest

ExternalRequest is derived from a sales order, quotation, or a service order and that can be fulfilled by planning and delivery. It contains the quantities a customer has requested of certain products at certain dates. BaseBusinessTransactionDocumentTypeCode is the type of the business document from which this external request was derived and that represents this ExternalRequest.

BusinessTransactionDocumentReference Package

BaseBusinessTransactionDocumentReference

A BaseBusinessTransactionDocumentReference is a reference to the business trans-action document from which the ExternalRequest was derived.

Item Package

The Item package groups the entity Item with its packages. ProductInformation contains the information about the requested product. Party contains the information about the parties that participate in an Item. Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved. ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason.

The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item.

Party Package

BuyerParty

A BuyerParty is a party that buys a product of an Item.

SellerParty

A SellerParty is a party that sells a product of an Item.

ProductRecipientParty

A ProductRecipientParty is a party to which a product of an Item is delivered.

Location Package

ShipToLocation

A ShipToLocation is a location to which goods are shipped.

ShipFromLocation

ShipFromLocation is a location from which goods are shipped.

GroupInformation Package

Group

Group is a reference to a collection of requirement items with a special business flavour, for example a delivery group or a MultiItemSingleDeliveryLocation group. The group describes how the items of the group depend on each other.

Properties Package

Property

A Property is a consumer specific condition for execution of an availability check for an Item.

DeliveryInformation Package

DeliveryTerms

DeliveryTerms are the item-specific conditions and agreements that are valid for shipment or for the services and activities required for shipment. PriorityCode (optional) is the Priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package

BaseBusinessTransactionDocumentItemReference

BaseBusinessTransactionDocumentItemReference is a unique reference to an item of a business document from which the ExternalRequest was derived. BusinessTransactionDocumentItemReference is the identifier of the referenced item of a business document.

ScheduleLine Package

ScheduleLine

The ScheduleLine is a schedule line for an Item. It contains information about when and how much of the product defined in the higher-level item is requested. ID is the unique identifier of the schedule line in a Item. Quantity is the requested quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

AvailabilityConfirmation Package

The AvailabilityConfirmation package groups the entity AvailabilityConfirmation with its packages BusinessTransactionDocumentReference, which contains the reference to a related business transaction document, and Item, which contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

BusinessTransactionDocumentReference Package

BaseBusinessTransactionDocumentReference

A BaseBusinessTransactionDocumentReference is a reference to the business trans-action document from which the AvailabilityConfirmation was derived.

Item Package

The Item package groups the entity Item with its packages ProductInformation, Party, Location, GroupInformation, BusinessTransactionDocumentReference, ScheduleLine, and Item. ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business trans-action document item. ScheduleLine contains the schedule lines of the Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem. ExternalRequestItemUUID is the reference to the ExternalRequestItem for which this confirmation item is valid. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package

ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentItemReference Package

BaseBusinessTransactionDocumentItemReference

BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package

ScheduleLine

The ScheduleLine is a schedule line for an item of an AvailabilityConfirmation. It describes the date and quantity in which the confirmed product is desired or expected to be provided or shipped. ID is the unique identifier of the schedule line in a Item. Quantity is the confirmed quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Customer Package

At a high level, the customer package groups the customer with its basic data package. Generally, a customer is a business partner to whom materials or services are offered or made available. The customer can be represented by the following elements:

A CustomerID as a unique identifier of Customer.

A ReferenceID as a unique identifier of a Customer used as template when creating another customer.

The BasicData package contains the entities: Common, AddressInformation, and CommunicationData. The Common entity includes general information about the customer and may include, for example: i) a CustomerTypeCode is the coded representation of the type of a customer; ii) CustomerName is the name of a customer in structured form, including the form of address; iii) a BlockedIndicator specifies whether a customer is blocked or not; and iv) a NaturalPersonIndicator specifies whether the party is a natural person or not.

The AddressInformation contains the address of the customer and may include, for example: i) an AddressID is a unique identifier of an address; and ii) an Address contains structured information about many types of addresses. This information includes details about addresses, the postal address, and the physical location and communication connections.

The Address includes of the following elements of the GDT Address: The PhysicalAddress contains structured information about the physical location of the customer. The following concrete elements may be included for the AddressInformation:

i. A CountryCode is a coded representation of a country defined by either national or administrative/political borders.

ii. A RegionCode is the code for the region of the country in the address.

iii. A StreetPostalCode is the zip code in the street address.

iv. A POBoxPostalCode is the box zip code.

v. A CityName is the name of the city.

vi. A DistrictName is the name of the district.

vii. A POBoxID is the number of the post-office box.

viii. A POBoxIndicator specifies whether there is a PO Box address or not. This indicator is necessary if a PO Box number is not specified within a PO Box address.

ix. A POBoxCountryCode is the country code of the post-office box.

x. A POBoxRegionCode is the region code of the post-office box.

xi. A POBoxCityName is the name of the city for the post-office box.

xii. A StreetName is the name of the street.

xiii. A HouseID is the house number for the street in the address.

xiv. An AdditionalHouseID is an addition to the house number, e.g. apartment number.

xv. A BuildingID is the number or abbreviation for a building.

xvi. A RoomID is the number of the room in the building.

xvii. A CareOfName is a different receiver when the receiver is not the same as the addressee.

xviii. A TaxJurisdictionCode is the tax jurisdiction code part of the address.

A CommunicationData typically contains address communication data. The typical address communication data would be e-mail addresses or cell phone numbers. For example, the communication data may include an AddressID is a unique identifier of an address.

The AddressID contains the same value as the one of AddressID from AddressInformation. An Address often contains structured information about all types of addresses. This information includes details about addresses, the postal address, and the physical location and communication connections. The Address can include various concrete elements of the GDT: Address such as, for example, CorrespondenceLanguageCode, Telephone, MobilePhone, Facsimile, Email, and Web.

The Customer interfaces may include a CustomerBasicDataChangeRequest, which can be a request to the Business Partner Data Processing to change basic data of the customer. The interface may also include a CustomerBasicDataChangeConfirmation, which can be a confirmation sent by the Business Partner Data Processing concerning the request to change the basic data of the customer.

Message Data Type

The message data type CustomerRequirementConfirmationMessage_sync contains the ID of the CustomerRequirement included in the business document. The message data type CustomerRequirementConfirmationMessage_sync, therefore, provides the structure for the message types CustomerRequirementCreateConfirmation_sync, CustomerRequirementChangeConfirmation_sync and CustomerRequirementCancelConfirmation_sync and the interfaces that are based on it. FIG. 143 shows a CustomerRequirementConfirmationMessage_sync 143000 package. The CustomerRequirementConfirmationMessage_sync 143000 package is a CustomerRequirementConfirmationMessage_sync 143004 datatype. The CustomerRequirementConfirmationMessage_sync 143000 package includes a CustomerRequirementConfirmationMessage_sync 143002 entity. The CustomerRequirementConfirmationMessage_sync 143000 package includes various packages, namely CustomerRequirement 143006 and Log 143018.

The CustomerRequirement 143006 package includes a CustomerRequirement 143008 entity.

The CustomerRequirement 143008 entity has a cardinality of one 143010 meaning that for each instance of the CustomerRequirementConfirmationMessage_sync 143002 entity there is one CustomerRequirement 143008 entity. The CustomerRequirement 143008 entity includes an ID 143012 attribute.

The ID 143012 attribute is a BusinessTransactionDocumentID 143016 datatype. The ID 143012 attribute has a cardinality of one 143014 meaning that for each instance of the CustomerRequirement 143008 entity there is one ID 143012 attribute.

The Log 143018 package is a Log 143024 datatype. The Log 143018 package includes a Log 143020 entity.

The Log 143020 entity has a cardinality of one 143022 meaning that for each instance of the CustomerRequirementConfirmationMessage_sync 143002 entity there is one Log 143020 entity.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

3.2 Log Package

The log package groups the log information sent by Location Data Processing.

3.2.1 Log

The entity Log contains the information about the execution of an action.

Message Data Type

The message data type CustomerRequirementChangeRequestMessage_sync contains the CustomerRequirement included in the business document, and the business information that is relevant for sending a business document in a message. The message data type CustomerRequirementChangeRequestMessage_sync, therefore, provides the structure for the message type CustomerRequirementChangeRequest_sync and the interface that is based on it. FIGS. 142-1 through 142-19 show a CustomerRequirementChangeRequestMessage_sync 142000 package. The CustomerRequirementChangeRequestMessage_sync 142000 package is a CustomerRequirementChangeRequestMessage_sync 142004 datatype. The CustomerRequirementChangeRequestMessage_sync 142000 package includes a CustomerRequirementChangeRequestMessage_sync 142002 entity. The CustomerRequirementChangeRequestMessage_sync 142000 package includes a CustomerRequirement 142006 package.

The CustomerRequirement 142006 package includes a CustomerRequirement 142008 entity. The CustomerRequirement 142006 package includes various packages, namely ExternalRequest 142024 and AvailabilityConfirmation 1420360.

The CustomerRequirement 142008 entity has a cardinality of one 142010 meaning that for each instance of the CustomerRequirementChangeRequestMessage_sync 142002 entity there is one CustomerRequirement 142008 entity. The CustomerRequirement 142008 entity includes various attributes, namely ID 142012 and SystemAdministrativeData 142018.

The ID 142012 attribute is a BusinessTransactionDocumentID 142016 datatype. The ID 142012 attribute has a cardinality of one 142014 meaning that for each instance of the CustomerRequirement 142008 entity there is one ID 142012 attribute.

The SystemAdministrativeData 142018 attribute is a SystemAdministrativeData 142022 datatype. The SystemAdministrativeData 142018 attribute has a cardinality of one 142020 meaning that for each instance of the CustomerRequirement 142008 entity there is one SystemAdministrativeData 142018 attribute.

The ExternalRequest 142024 package includes an ExternalRequest 142026 entity. The ExternalRequest 142024 package includes various packages, namely BusinessTransactionDocumentReference 142038 and Item 142052.

The ExternalRequest 142026 entity has a cardinality of one 142028 meaning that for each instance of the CustomerRequirement 142008 entity there is one ExternalRequest 142026 entity. The ExternalRequest 142026 entity includes a BaseBusinessTransactionDocumentTypeCode 142032 attribute.

The BaseBusinessTransactionDocumentTypeCode 142032 attribute is a BusinessTransactionDocumentTypeCode 142036 datatype. The BaseBusinessTransactionDocumentTypeCode 142032 attribute has a cardinality of one 142034 meaning that for each instance of the ExternalRequest 142026 entity there is one BaseBusinessTransactionDocumentTypeCode 142032 attribute.

The BusinessTransactionDocumentReference 142038 package includes a BaseBusinessTransactionDocumentReference 142040 entity.

The BaseBusinessTransactionDocumentReference 142040 entity has a cardinality of zero or one 142042 meaning that for each instance of the ExternalRequest 142026 entity there may be one BaseBusinessTransactionDocumentReference 142040 entity. The BaseBusinessTransactionDocumentReference 142040 entity includes an ID 142046 attribute.

The ID 142046 attribute is a BusinessTransactionDocumentID 142050 datatype. The ID 142046 attribute has a cardinality of one 142048 meaning that for each instance of the BaseBusinessTransactionDocumentReference 142040 entity there is one ID 142046 attribute.

The Item 142052 package includes an Item 142054 entity. The Item 142052 package includes various packages, namely ProductInformation 1420108, Party 1420140, Location 1420178, GroupInformation 1420216, Properties 1420236, DeliveryInformation 1420256, Transportation 1420294, BusinessTransactionDocumentItemReference 1420308 and ScheduleLine 1420322.

The Item 142054 entity has a cardinality of one or n 142056 meaning that for each instance of the ExternalRequest 142026 entity there are one or more Item 142054 entities. The Item 142054 entity includes various attributes, namely ProductAvailabilityRequirementConfirmationItemUUID 142060, ID 142066, SupplyPlanningAreaID 142072, BaseBusinessTransactionDocumentItemTypeCode 142078, DistributionChannelCode 142084, DivisionCode 142090, LogisticsExecutionBlockingReasonCode 142096 and CancellationReasonCode 1420102.

The Product AvailabilityRequirementConfirmationItemUUID 142060 attribute is an UUID 142064 datatype. The ProductAvailabilityRequirementConfirmationItemUUID 142060 attribute has a cardinality of zero or one 142062 meaning that for each instance of the Item 142054 entity there may be one ProductAvailabilityRequirementConfirmationItemUUID 142060 attribute.

The ID 142066 attribute is a BusinessTransactionDocumentItemID 142070 datatype. The ID 142066 attribute has a cardinality of one 142068 meaning that for each instance of the Item 142054 entity there is one ID 142066 attribute.

The SupplyPlanningAreaID 142072 attribute is a SupplyPlanningAreaID 142076 datatype. The SupplyPlanningAreaID 142072 attribute has a cardinality of zero or one 142074 meaning that for each instance of the Item 142054 entity there may be one SupplyPlanningAreaID 142072 attribute.

The BaseBusinessTransactionDocumentItemTypeCode 142078 attribute is a BusinessTransactionDocumentItemTypeCode 142082 datatype. The BaseBusinessTransactionDocumentItemTypeCode 142078 attribute has a cardinality of zero or one 142080 meaning that for each instance of the Item 142054 entity there may be one BaseBusinessTransactionDocumentItemTypeCode 142078 attribute.

The DistributionChannelCode 142084 attribute is a DistributionChannelCode 142088 datatype. The DistributionChannelCode 142084 attribute has a cardinality of zero or one 142086 meaning that for each instance of the Item 142054 entity there may be one DistributionChannelCode 142084 attribute.

The DivisionCode 142090 attribute is a DivisionCode 142094 datatype. The DivisionCode 142090 attribute has a cardinality of zero or one 142092 meaning that for each instance of the Item 142054 entity there may be one DivisionCode 142090 attribute.

The LogisticsExecutionBlockingReasonCode 142096 attribute is a BlockingReasonCode 1420100 datatype. The LogisticsExecutionBlockingReasonCode 142096 attribute has a cardinality of zero or one 142098 meaning that for each instance of the Item 142054 entity there may be one LogisticsExecutionBlockingReasonCode 142096 attribute.

The CancellationReasonCode 1420102 attribute is a CancellationReasonCode 1420106 datatype. The CancellationReasonCode 1420102 attribute has a cardinality of zero or one 1420104 meaning that for each instance of the Item 142054 entity there may be one CancellationReasonCode 1420102 attribute.

The ProductInformation 1420108 package includes a Product 1420110 entity.

The Product 1420110 entity has a cardinality of one 1420112 meaning that for each instance of the Item 142054 entity there is one Product 1420110 entity. The Product 1420110 entity includes various attributes, namely InternalID 1420116, SellerID 1420122, BuyerID 1420128 and IdentifiedStockID 1420134.

The InternalID 1420116 attribute is a ProductInternalID 1420120 datatype. The InternalID 1420116 attribute has a cardinality of one 1420118 meaning that for each instance of the Product 1420110 entity there is one InternalID 1420116 attribute.

The SellerID 1420122 attribute is a ProductPartyID 1420126 datatype. The SellerID 1420122 attribute has a cardinality of zero or one 1420124 meaning that for each instance of the Product 1420110 entity there may be one SellerID 1420122 attribute.

The BuyerID 1420128 attribute is a ProductPartyID 1420132 datatype. The BuyerID 1420128 attribute has a cardinality of zero or one 1420130 meaning that for each instance of the Product 1420110 entity there may be one BuyerID 1420128 attribute.

The IdentifiedStockID 1420134 attribute is an IdentifiedStockID 1420138 datatype. The IdentifiedStockID 1420134 attribute has a cardinality of zero or one 1420136 meaning that for each instance of the Product 1420110 entity there may be one IdentifiedStockID 1420134 attribute.

The Party 1420140 package includes various entities, namely BuyerParty 1420142, SellerParty 1420154 and ProductRecipientParty 1420166.

The BuyerParty 1420142 entity has a cardinality of zero or one 1420144 meaning that for each instance of the Item 142054 entity there may be one BuyerParty 1420142 entity. The BuyerParty 1420142 entity includes an ID 1420148 attribute.

The ID 1420148 attribute is a PartyID 1420152 datatype. The ID 1420148 attribute has a cardinality of one 1420150 meaning that for each instance of the BuyerParty 1420142 entity there is one ID 1420148 attribute.

The SellerParty 1420154 entity has a cardinality of zero or one 1420156 meaning that for each instance of the Item 142054 entity there may be one SellerParty 1420154 entity. The SellerParty 1420154 entity includes an ID 1420160 attribute.

The ID 1420160 attribute is a PartyID 1420164 datatype. The ID 1420160 attribute has a cardinality of one 1420162 meaning that for each instance of the SellerParty 1420154 entity there is one ID 1420160 attribute.

The ProductRecipientParty 1420166 entity has a cardinality of zero or one 1420168 meaning that for each instance of the Item 142054 entity there may be one ProductRecipientParty 1420166 entity. The ProductRecipientParty 1420166 entity includes an ID 1420172 attribute.

The ID 1420172 attribute is a PartyID 1420176 datatype. The ID 1420172 attribute has a cardinality of one 1420174 meaning that for each instance of the ProductRecipientParty 1420166 entity there is one ID 1420172 attribute.

The Location 1420178 package includes various entities, namely ShipToLocation 1420180 and ShipFromLocation 1420198.

The ShipToLocation 1420180 entity has a cardinality of zero or one 1420182 meaning that for each instance of the Item 142054 entity there may be one ShipToLocation 1420180 entity. The ShipToLocation 1420180 entity includes various attributes, namely BuyerID 1420186 and SellerID 1420192.

The BuyerID 1420186 attribute is a LocationPartyID 1420190 datatype. The BuyerID 1420186 attribute has a cardinality of zero or one 1420188 meaning that for each instance of the ShipToLocation 1420180 entity there may be one BuyerID 1420186 attribute.

The SellerID 1420192 attribute is a LocationPartyID 1420196 datatype. The SellerID 1420192 attribute has a cardinality of zero or one 1420194 meaning that for each instance of the ShipToLocation 1420180 entity there may be one SellerID 1420192 attribute.

The ShipFromLocation 1420198 entity has a cardinality of zero or one 1420200 meaning that for each instance of the Item 142054 entity there may be one ShipFromLocation 1420198 entity. The ShipFromLocation 1420198 entity includes various attributes, namely BuyerID 1420204 and SellerID 1420210.

The BuyerID 1420204 attribute is a LocationPartyID 1420208 datatype. The BuyerID 1420204 attribute has a cardinality of zero or one 1420206 meaning that for each instance of the ShipFromLocation 1420198 entity there may be one BuyerID 1420204 attribute.

The SellerID 1420210 attribute is a LocationPartyID 1420214 datatype. The SellerID 1420210 attribute has a cardinality of zero or one 1420212 meaning that for each instance of the ShipFromLocation 1420198 entity there may be one SellerID 1420210 attribute.

The GroupInformation 1420216 package includes a Group 1420218 entity.

The Group 1420218 entity has a cardinality of zero or one 1420220 meaning that for each instance of the Item 142054 entity there may be one Group 1420218 entity. The Group 1420218 entity includes various attributes, namely ID 1420224 and HierarchyRelationshipTypeCode 1420230.

The ID 1420224 attribute is a BusinessTransactionDocumentItemGroupID 1420228 datatype. The ID 1420224 attribute has a cardinality of one 1420226 meaning that for each instance of the Group 1420218 entity there is one ID 1420224 attribute.

The HierarchyRelationshipTypeCode 1420230 attribute is a BusinessTransactionDocumentItemHierarchyRelationshipTypeCode 1420234 datatype. The HierarchyRelationshipTypeCode 1420230 attribute has a cardinality of zero or one 1420232 meaning that for each instance of the Group 1420218 entity there may be one HierarchyRelationshipTypeCode 1420230 attribute.

The Properties 1420236 package includes a Property 1420238 entity.

The Property 1420238 entity has a cardinality of zero or n 1420240 meaning that for each instance of the Item 142054 entity there may be one or more Property 1420238 entities. The Property 1420238 entity includes various attributes, namely ID 1420244 and Value 1420250.

The ID 1420244 attribute is a PropertyID 1420248 datatype. The ID 1420244 attribute has a cardinality of one 1420246 meaning that for each instance of the Property 1420238 entity there is one ID 1420244 attribute.

The Value 1420250 attribute is a PropertyValue 1420254 datatype. The Value 1420250 attribute has a cardinality of one 1420252 meaning that for each instance of the Property 1420238 entity there is one Value 1420250 attribute.

The DeliveryInformation 1420256 package includes a DeliveryTerms 1420258 entity.

The DeliveryTerms 1420258 entity has a cardinality of zero or one 1420260 meaning that for each instance of the Item 142054 entity there may be one DeliveryTerms 1420258 entity. The DeliveryTerms 1420258 entity includes various attributes, namely PriorityCode 1420264, Incoterms 1420270, PartialDeliveryMaximumNumberValue 1420276, QuantityTolerance 1420282 and PartialDeliveryControlCode 1420288.

The PriorityCode 1420264 attribute is a PriorityCode 1420268 datatype. The PriorityCode 1420264 attribute has a cardinality of zero or one 1420266 meaning that for each instance of the DeliveryTerms 1420258 entity there may be one PriorityCode 1420264 attribute.

The Incoterms 1420270 attribute is an Incoterms 1420274 datatype. The Incoterms 1420270 attribute has a cardinality of zero or one 1420272 meaning that for each instance of the DeliveryTerms 1420258 entity there may be one Incoterms 1420270 attribute.

The PartialDeliveryMaximumNumberValue 1420276 attribute is a NumberValue 1420280 datatype. The PartialDeliveryMaximumNumberValue 1420276 attribute has a cardinality of zero or one 1420278 meaning that for each instance of the DeliveryTerms 1420258 entity there may be one PartialDeliveryMaximumNumberValue 1420276 attribute.

The QuantityTolerance 1420282 attribute is a QuantityTolerance 1420286 datatype. The QuantityTolerance 1420282 attribute has a cardinality of zero or one 1420284 meaning that for each instance of the DeliveryTerms 1420258 entity there may be one QuantityTolerance 1420282 attribute.

The PartialDeliveryControlCode 1420288 attribute is a PartialDeliveryControlCode 1420292 datatype. The PartialDeliveryControlCode 1420288 attribute has a cardinality of zero or one 1420290 meaning that for each instance of the DeliveryTerms 1420258 entity there may be one PartialDeliveryControlCode 1420288 attribute.

The Transportation 1420294 package includes a TransportationTerms 1420296 entity.

The TransportationTerms 1420296 entity has a cardinality of zero or one 1420298 meaning that for each instance of the Item 142054 entity there may be one TransportationTerms 1420296 entity. The TransportationTerms 1420296 entity includes a TransportServiceLevelCode 1420302 attribute.

The TransportServiceLevelCode 1420302 attribute is a TransportServiceLevelCode 1420306 datatype. The TransportServiceLevelCode 1420302 attribute has a cardinality of zero or one 1420304 meaning that for each instance of the TransportationTerms 1420296 entity there may be one TransportServiceLevelCode 1420302 attribute.

The BusinessTransactionDocumentItemReference 1420308 package includes a BaseBusinessTransactionDocumentItemReference 1420310 entity.

The BaseBusinessTransactionDocumentItemReference 1420310 entity has a cardinality of zero or one 1420312 meaning that for each instance of the Item 142054 entity there may be one BaseBusinessTransactionDocumentItemReference 1420310 entity. The BaseBusinessTransactionDocumentItemReference 1420310 entity includes a BusinessTransactionDocumentItemReference 1420316 attribute.

The BusinessTransactionDocumentItemReference 1420316 attribute is a BusinessTransactionDocumentReference 1420320 datatype. The BusinessTransactionDocumentItemReference 1420316 attribute has a cardinality of one 1420318 meaning that for each instance of the BaseBusinessTransactionDocumentItemReference 1420310 entity there is one BusinessTransactionDocumentItemReference 1420316 attribute.

The ScheduleLine 1420322 package includes a ScheduleLine 1420324 entity.

The ScheduleLine 1420324 entity has a cardinality of one or n 1420326 meaning that for each instance of the Item 142054 entity there are one or more ScheduleLine 1420324 entities. The ScheduleLine 1420324 entity includes various attributes, namely ID 1420330 and Quantity 1420336. The ScheduleLine 1420324 entity includes a TimeSegment 1420342 subordinate entity.

The ID 1420330 attribute is a BusinessTransactionDocumentItemScheduleLineID 1420334 datatype. The ID 1420330 attribute has a cardinality of one 1420332 meaning that for each instance of the ScheduleLine 1420324 entity there is one ID 1420330 attribute.

The Quantity 1420336 attribute is a Quantity 1420340 datatype. The Quantity 1420336 attribute has a cardinality of one 1420338 meaning that for each instance of the ScheduleLine 1420324 entity there is one Quantity 1420336 attribute.

The TimeSegment 1420342 entity has a cardinality of one or n 1420344 meaning that for each instance of the ScheduleLine 1420324 entity there are one or more TimeSegment 1420342 entities. The TimeSegment 1420342 entity includes various attributes, namely DateTimePeriod 1420348 and PeriodRoleCode 1420354.

The DateTimePeriod 1420348 attribute is an UPPEROPEN_GLOBAL_DateTimePeriod 1420352 datatype. The DateTimePeriod 1420348 attribute has a cardinality of one 1420350 meaning that for each instance of the TimeSegment 1420342 entity there is one DateTimePeriod 1420348 attribute.

The PeriodRoleCode 1420354 attribute is a PeriodRoleCode 1420358 datatype. The PeriodRoleCode 1420354 attribute has a cardinality of one 1420356 meaning that for each instance of the TimeSegment 1420342 entity there is one PeriodRoleCode 1420354 attribute.

The AvailabilityConfirmation 1420360 package includes an AvailabilityConfirmation 1420362 entity. The AvailabilityConfirmation 1420360 package includes various packages, namely BusinessTransactionDocumentReference 1420374 and Item 1420388.

The AvailabilityConfirmation 1420362 entity has a cardinality of zero or one 1420364 meaning that for each instance of the CustomerRequirement 142008 entity there may be one AvailabilityConfirmation 1420362 entity. The AvailabilityConfirmation 1420362 entity includes a BaseBusinessTransactionDocumentTypeCode 1420368 attribute.

The BaseBusinessTransactionDocumentTypeCode 1420368 attribute is a BusinessTransactionDocumentTypeCode 1420372 datatype. The BaseBusinessTransactionDocumentTypeCode 1420368 attribute has a cardinality of one 1420370 meaning that for each instance of the AvailabilityConfirmation 1420362 entity there is one BaseBusinessTransactionDocumentTypeCode 1420368 attribute.

The BusinessTransactionDocumentReference 1420374 package includes a BaseBusinessTransactionDocumentReference 1420376 entity.

The BaseBusinessTransactionDocumentReference 1420376 entity has a cardinality of zero or one 1420378 meaning that for each instance of the AvailabilityConfirmation 1420362 entity there may be one BaseBusinessTransactionDocumentReference 1420376 entity. The BaseBusinessTransactionDocumentReference 1420376 entity includes an ID 1420382 attribute.

The ID 1420382 attribute is a BusinessTransactionDocumentID 1420386 datatype. The ID 1420382 attribute has a cardinality of one 1420384 meaning that for each instance of the BaseBusinessTransactionDocumentReference 1420376 entity there is one ID 1420382 attribute.

The Item 1420388 package includes an Item 1420390 entity. The Item 1420388 package includes various packages, namely ProductInformation 1420432, Location 1420464, GroupInformation 1420484, BusinessTransactionDocumentItemReference 1420504 and ScheduleLine 1420530.

The Item 1420390 entity has a cardinality of one or n 1420392 meaning that for each instance of the AvailabilityConfirmation 1420362 entity there are one or more Item 1420390 entities. The Item 1420390 entity includes various attributes, namely ProductAvailabilityRequirementConfirmationItemUUID 1420396, ID 1420402, BaseBusinessTransactionDocumentItemTypeCode 1420408, SystemAdministrativeData 1420414, SupplyPlanningAreaID 1420420 and ExternalRequestItemUUID 1420426.

The ProductAvailabilityRequirementConfirmationItemUUID 1420396 attribute is an UUID 1420400 datatype. The ProductAvailabilityRequirementConfirmationItemUUID 1420396 attribute has a cardinality of zero or one 1420398 meaning that for each instance of the Item 1420390 entity there may be one ProductAvailabilityRequirementConfirmationItemUUID 1420396 attribute.

The ID 1420402 attribute is a BusinessTransactionDocumentItemID 1420406 datatype. The ID 1420402 attribute has a cardinality of one 1420404 meaning that for each instance of the Item 1420390 entity there is one ID 1420402 attribute.

The BaseBusinessTransactionDocumentItemTypeCode 1420408 attribute is a BusinessTransactionDocumentItemTypeCode 1420412 datatype. The BaseBusinessTransactionDocumentItemTypeCode 1420408 attribute has a cardinality of zero or one 1420410 meaning that for each instance of the Item 1420390 entity there may be one BaseBusinessTransactionDocumentItemTypeCode 1420408 attribute.

The SystemAdministrativeData 1420414 attribute is a SystemAdministrativeData 1420418 datatype. The SystemAdministrativeData 1420414 attribute has a cardinality of one 1420416 meaning that for each instance of the Item 1420390 entity there is one SystemAdministrativeData 1420414 attribute.

The SupplyPlanningAreaID 1420420 attribute is a SupplyPlanningAreaID 1420424 datatype. The SupplyPlanningAreaID 1420420 attribute has a cardinality of zero or one 1420422 meaning that for each instance of the Item 1420390 entity there may be one SupplyPlanningAreaID 1420420 attribute.

The ExternalRequestItemUUID 1420426 attribute is an UUID 1420430 datatype. The ExternalRequestItemUUID 1420426 attribute has a cardinality of one 1420428 meaning that for each instance of the Item 1420390 entity there is one ExternalRequestItemUUID 1420426 attribute.

The ProductInformation 1420432 package includes a Product 1420434 entity.

The Product 1420434 entity has a cardinality of one 1420436 meaning that for each instance of the Item 1420390 entity there is one Product 1420434 entity. The Product 1420434 entity includes various attributes, namely InternalID 1420440, SellerID 1420446, BuyerID 1420452 and IdentifiedStockID 1420458.

The InternalID 1420440 attribute is a ProductInternalID 1420444 datatype. The InternalID 1420440 attribute has a cardinality of one 1420442 meaning that for each instance of the Product 1420434 entity there is one InternalID 1420440 attribute.

The SellerID 1420446 attribute is a ProductPartyID 1420450 datatype. The SellerID 1420446 attribute has a cardinality of zero or one 1420448 meaning that for each instance of the Product 1420434 entity there may be one SellerID 1420446 attribute.

The BuyerID 1420452 attribute is a ProductPartyID 1420456 datatype. The BuyerID 1420452 attribute has a cardinality of zero or one 1420454 meaning that for each instance of the Product 1420434 entity there may be one BuyerID 1420452 attribute.

The IdentifiedStockID 1420458 attribute is an IdentifiedStockID 1420462 datatype. The IdentifiedStockID 1420458 attribute has a cardinality of zero or one 1420460 meaning that for each instance of the Product 1420434 entity there may be one IdentifiedStockID 1420458 attribute.

The Location 1420464 package includes a ShipFromLocation 1420466 entity.

The ShipFromLocation 1420466 entity has a cardinality of one 1420468 meaning that for each instance of the Item 1420390 entity there is one ShipFromLocation 1420466 entity. The ShipFromLocation 1420466 entity includes various attributes, namely BuyerID 1420472 and SellerID 1420478.

The BuyerID 1420472 attribute is a LocationPartyID 1420476 datatype. The BuyerID 1420472 attribute has a cardinality of zero or one 1420474 meaning that for each instance of the ShipFromLocation 1420466 entity there may be one BuyerID 1420472 attribute.

The SellerID 1420478 attribute is a LocationPartyID 1420482 datatype. The SellerID 1420478 attribute has a cardinality of zero or one 1420480 meaning that for each instance of the ShipFromLocation 1420466 entity there may be one SellerID 1420478 attribute.

The GroupInformation 1420484 package includes a Group 1420486 entity.

The Group 1420486 entity has a cardinality of zero or one 1420488 meaning that for each instance of the Item 1420390 entity there may be one Group 1420486 entity. The Group 1420486 entity includes various attributes, namely ID 1420492 and HierarchyRelationshipTypeCode 1420498.

The ID 1420492 attribute is a BusinessTransactionDocumentItemGroupID 1420496 datatype. The ID 1420492 attribute has a cardinality of one 1420494 meaning that for each instance of the Group 1420486 entity there is one ID 1420492 attribute.

The HierarchyRelationshipTypeCode 1420498 attribute is a BusinessTransactionDocumentItemHierarchyRelationshipTypeCode 1420502 datatype. The HierarchyRelationshipTypeCode 1420498 attribute has a cardinality of zero or one 1420500 meaning that for each instance of the Group 1420486 entity there may be one HierarchyRelationshipTypeCode 1420498 attribute.

The BusinessTransactionDocumentItemReference 1420504 package includes various entities, namely BaseBusinessTransactionDocumentItemReference 1420506 and OutboundDeliveryReference 1420518.

The BaseBusinessTransactionDocumentItemReference 1420506 entity has a cardinality of zero or one 1420508 meaning that for each instance of the Item 1420390 entity there may be one BaseBusinessTransactionDocumentItemReference 1420506 entity. The BaseBusinessTransactionDocumentItemReference 1420506 entity includes a BusinessTransactionDocumentItemReference 1420512 attribute.

The BusinessTransactionDocumentItemReference 1420512 attribute is a BusinessTransactionDocumentReference 1420516 datatype. The BusinessTransactionDocumentItemReference 1420512 attribute has a cardinality of one 1420514 meaning that for each instance of the BaseBusinessTransactionDocumentItemReference 1420506 entity there is one BusinessTransactionDocumentItemReference 1420512 attribute.

The OutboundDeliveryReference 1420518 entity has a cardinality of zero or one 1420520 meaning that for each instance of the Item 1420390 entity there may be one OutboundDeliveryReference 1420518 entity. The OutboundDeliveryReference 1420518 entity includes a BusinessTransactionDocumentItemReference 1420524 attribute.

The BusinessTransactionDocumentItemReference 1420524 attribute is a BusinessTransactionDocumentReference 1420528 datatype. The BusinessTransactionDocumentItemReference 1420524 attribute has a cardinality of one 1420526 meaning that for each instance of the OutboundDeliveryReference 1420518 entity there is one BusinessTransactionDocumentItemReference 1420524 attribute.

The ScheduleLine 1420530 package includes a ScheduleLine 1420532 entity.

The ScheduleLine 1420532 entity has a cardinality of one or n 1420534 meaning that for each instance of the Item 1420390 entity there are one or more ScheduleLine 1420532 entities. The ScheduleLine 1420532 entity includes various attributes, namely ID 1420538 and Quantity 1420544. The ScheduleLine 1420532 entity includes a TimeSegment 1420550 subordinate entity.

The ID 1420538 attribute is a BusinessTransactionDocumentItemScheduleLineID 1420542 datatype. The ID 1420538 attribute has a cardinality of one 1420540 meaning that for each instance of the ScheduleLine 1420532 entity there is one ID 1420538 attribute.

The Quantity 1420544 attribute is a Quantity 1420548 datatype. The Quantity 1420544 attribute has a cardinality of one 1420546 meaning that for each instance of the ScheduleLine 1420532 entity there is one Quantity 1420544 attribute.

The TimeSegment 1420550 entity has a cardinality of one or n 1420552 meaning that for each instance of the ScheduleLine 1420532 entity there are one or more TimeSegment 1420550 entities. The TimeSegment 1420550 entity includes various attributes, namely DateTimePeriod 1420556 and PeriodRoleCode 1420562.

The DateTimePeriod 1420556 attribute is an UPPEROPEN_GLOBAL_DateTimePeriod 1420560 datatype. The DateTimePeriod 1420556 attribute has a cardinality of one 1420558 meaning that for each instance of the TimeSegment 1420550 entity there is one DateTimePeriod 1420556 attribute.

The PeriodRoleCode 1420562 attribute is a PeriodRoleCode 1420566 datatype. The PeriodRoleCode 1420562 attribute has a cardinality of one 1420564 meaning that for each instance of the TimeSegment 1420550 entity there is one PeriodRoleCode 1420562 attribute.

CustomerRequirement Package

The CustomerRequirement package groups the entity CustomerRequirement with its packages ExternalRequest and AvailabilityConfirmation. ExternalRequest is a requirement containing the quantities required of specific products as well as the dates at which they are required. AvailabilityConfirmation is a confirmation of the available quantities of the products or suitable substitute products, the location in which they are available as well as the dates at which they are available.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

ExternalRequest Package

The ExternalRequest package groups the entity ExternalRequest with its packages BusinessTransactionDocumentReference and Item. BusinessTransactionDocumentReference contains the reference to a related business transaction document. Item contains all the item related data of an ExternalRequest.

ExternalRequest

ExternalRequest is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

BusinessTransactionDocumentReference Package

BaseBusinessTransactionDocumentReference

A BaseBusinessTransactionDocumentReference is a reference to the business trans-action document from which the ExternalRequest was derived.

Item Package

ProductInformation contains the information about the requested product. Party contains the information about the parties that participate in an Item. Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved. ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the buyer. IdentifiedStockID (optional) is the unique identifier of the product batch.

Party Package

BuyerParty

A BuyerParty is a party that buys a product of an Item. ID is the identifier of the Buyer within the CustomerRequirement.

SellerParty

A SellerParty is a party that sells a product of an Item. ID is the identifier of the Seller within the CustomerRequirement.

ProductRecipientParty

A ProductRecipientParty is a party to which a product of an Item is delivered. ID is the identifier of the ProductRecipient within the CustomerRequirement.

Location Package

ShipToLocation

A ShipToLocation is a location to which goods are shipped. BuyerID (optional) is the identification of the ShipToLocation that is specified by the product buyer. SellerID (optional) is the identification of the ShipToLocation that is specified by the product seller. One of the IDs (either BuyerID or SellerID) can be filled with value. The interface evaluates the values in sequence 'BuyerID, SellerID' and uses the first found one.

ShipFromLocation

ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

Property

A Property is a consumer specific condition for execution of an availability check for an Item. The properties are also used in an availability check that can be optionally executed before the CustomerRequirement is stored. ID is the identification of the property. Value is the value of the property.

DeliveryInformation Package

DeliveryTerms

DeliveryTerms are the item-specific conditions and agreements that are valid for shipment or for the services and activities required for shipment. PriorityCode (optional) is the priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package
BaseBusinessTransactionDocumentItemReference BaseBusinessTransactionDocumentItemReference is a unique reference to an item of a business document from which the ExternalRequest was derived. BusinessTransactionDocumentItemReference is the identifier of the referenced item of a business document.

ScheduleLine Package
ScheduleLine

The ScheduleLine is a schedule line for an Item. It contains information about when and how much of the product defined in the higher-level item is requested. ID is the unique identifier of the schedule line in a Item. Quantity is the requested quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

AvailabilityConfirmation Package

The AvailabilityConfirmation package groups the entity AvailabilityConfirmation with its packages. BusinessTransactionDocumentReference contains the reference to a related business transaction document. Item contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

BusinessTransactionDocumentReference Package
BaseBusinessTransactionDocumentReference A BaseBusinessTransactionDocumentReference is a reference to the business trans-action document from which the AvailabilityConfirmation was derived.

Item Package

ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business transaction document item. ScheduleLine contains the schedule lines of the Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem.

ExternalRequestItemUUID is the reference to the ExternalRequestItem for which this confirmation item is valid. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage
Product

A Product is the identification, description, and classification of the product in the Item. InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package
ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package
Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentReference Package
BaseBusinessTransactionDocumentItemReference BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package
ScheduleLine

The ScheduleLine is a schedule line for an item of an AvailabilityConfirmation. It describes the date and quantity in which the confirmed product is desired or expected to be provided or shipped. ID is the unique identifier of the schedule line in an Item. Quantity is the confirmed quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Message Data Type

The message data type CustomerRequirementCancelRequestMessage_sync contains the ID of the CustomerRequirement included in the business document. The message data type CustomerRequirementCancelRequestMessage_sync, therefore, provides the structure for the message type CustomerRequirementCancelRequest_sync and the interface that is based on it. FIG. 141 shows a CustomerRequirementCancelRequestMessage_sync 141000 package. The CustomerRequirementCancelRequestMessage_sync 141000 package is a CustomerRequirementCancelRequestMessage_sync 141006 datatype. The CustomerRequirementCancelRequestMessage_sync 141000 package includes a CustomerRequirementCancelRequestMessage_sync 141002 entity. The CustomerRequirementCancelRequestMessage_sync 141000 package includes a CustomerRequirement 141008 package.

The CustomerRequirement 141008 package includes a CustomerRequirement 141010 entity.

The CustomerRequirement 141010 entity includes an ID 141016 attribute.

The ID 141016 attribute is a BusinessTransactionDocumentID 141022 datatype. The ID 141016 attribute has a cardinality of one 141018 meaning that for each instance of the CustomerRequirement 141010 entity there is one ID 141016 attribute.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

Message Data Type

The message data type CustomerRequirementByIDQueryMessage_sync contains the ID of the CustomerRequirement included in the business document. The message data type CustomerRequirementByIDQueryMessage_sync, therefore, provides the structure for the message type CustomerRequirementByIDQuery_sync and the interface that is based on it. FIG. 139 shows a CustomerRequirementByIDQueryMessage_sync 139000 package. The CustomerRequirementByIDQueryMessage_sync 139000 package is a CustomerRequirementByIDQueryMessage_sync 139004 datatype. The CustomerRequirementByIDQueryMessage_sync 139000 package includes a CustomerRequirementByIDQueryMessage__sync 139002 entity. The CustomerRequirementByIDQueryMessage_sync 139000 package includes a Selection 139006 package.

The Selection 139006 package includes a CustomerRequirementSelectionByID 139008 entity.

The CustomerRequirementSelectionByID 139008 entity has a cardinality of one 139010 meaning that for each instance of the CustomerRequirementByIDQueryMessage_sync 139002 entity there is one CustomerRequirementSelectionByID 139008 entity. The CustomerRequirementSelectionByID 139008 entity includes an ID 139012 attribute.

The ID 139012 attribute is a BusinessTransactionDocumentID 139016 datatype. The ID 139012 attribute has a cardinality of one 139014 meaning that for each instance of the CustomerRequirementSelectionByID 139008 entity there is one ID 139012 attribute.

Selection

CustomerRequirementByIDSelection

A CustomerRequirementByIDSelection is the ID of a CustomerRequirement. ID is the unique identifier of a CustomerRequirement.

Message Data Type

The CustomerRequirement included in the business document. The business information that is relevant for sending a business document in a message. The message data type CustomerRequirementByIDResponseMessage_sync, therefore, provides the structure for the message type CustomerRequirementByIDResponse_sync and the interface that is based on it. FIGS. 140-1 through 140-19 show a CustomerRequirementByIDResponseMessage_sync 140000 package. The CustomerRequirementByIDResponseMessage_sync 140000 package is a CustomerRequirementByIDResponseMessage_sync 140004 datatype. The CustomerRequirementByIDResponseMessage_sync 140000 package includes a CustomerRequirementByIDResponseMessage_sync 140002 entity. The CustomerRequirementByIDResponseMessage_sync 140000 package includes various packages, namely CustomerRequirement 140006 and Log 1400568.

The CustomerRequirement 140006 package includes a CustomerRequirement 140008 entity. The CustomerRequirement 140006 package includes various packages, namely ExternalRequest 140024 and AvailabilityConfirmation 1400360.

The CustomerRequirement 140008 entity has a cardinality of one 140010 meaning that for each instance of the CustomerRequirementByIDResponseMessage_sync 140002 entity there is one CustomerRequirement 140008 entity. The CustomerRequirement 140008 entity includes various attributes, namely ID 140012 and SystemAdministrativeData 140018.

The ID 140012 attribute is a BusinessTransactionDocumentID 140016 datatype. The ID 140012 attribute has a cardinality of one 140014 meaning that for each instance of the CustomerRequirement 140008 entity there is one ID 140012 attribute.

The SystemAdministrativeData 140018 attribute is a SystemAdministrativeData 140022 datatype. The SystemAdministrativeData 140018 attribute has a cardinality of one 140020 meaning that for each instance of the CustomerRequirement 140008 entity there is one SystemAdministrativeData 140018 attribute.

The ExternalRequest 140024 package includes an ExternalRequest 140026 entity. The ExternalRequest 140024 package includes various packages, namely BusinessTransactionDocumentReference 140038 and Item 140052.

The ExternalRequest 140026 entity has a cardinality of one 140028 meaning that for each instance of the CustomerRequirement 140008 entity there is one ExternalRequest 140026 entity. The ExternalRequest 140026 entity includes a BaseBusinessTransactionDocumentTypeCode 140032 attribute.

The BaseBusinessTransactionDocumentTypeCode 140032 attribute is a BusinessTransactionDocumentTypeCode 140036 datatype. The BaseBusinessTransactionDocumentTypeCode 140032 attribute has a cardinality of one 140034 meaning that for each instance of the ExternalRequest 140026 entity there is one BaseBusinessTransactionDocumentTypeCode 140032 attribute.

The BusinessTransactionDocumentReference 140038 package includes a BaseBusinessTransactionDocumentReference 140040 entity.

The BaseBusinessTransactionDocumentReference 140040 entity has a cardinality of zero or one 140042 meaning that for each instance of the ExternalRequest 140026 entity there may be one BaseBusinessTransactionDocumentReference 140040 entity. The BaseBusinessTransactionDocumentReference 140040 entity includes an ID 140046 attribute.

The ID 140046 attribute is a BusinessTransactionDocumentID 140050 datatype. The ID 140046 attribute has a cardinality of one 140048 meaning that for each instance of the BaseBusinessTransactionDocumentReference 140040 entity there is one ID 140046 attribute.

The Item 140052 package includes an Item 140054 entity. The Item 140052 package includes various packages, namely ProductInformation 1400108, Party 1400140, Location 1400178, GroupInformation 1400216, Properties 1400236, DeliveryInformation 1400256, Transportation 1400294, BusinessTransactionDocumentItemReference 1400308 and ScheduleLine 1400322.

The Item 140054 entity has a cardinality of one or n 140056 meaning that for each instance of the ExternalRequest 140026 entity there are one or more Item 140054 entities. The Item 140054 entity includes various attributes, namely ProductAvailabilityRequirementConfirmationItemUUID 140060, ID 140066, SupplyPlanningAreaID 140072, BaseBusinessTransactionDocumentItemTypeCode 140078, DistributionChannelCode 140084, DivisionCode 140090, LogisticsExecutionBlockingReasonCode 140096 and CancellationReasonCode 1400102.

The ProductAvailabilityRequirementConfirmationItemUUID 140060 attribute is an UUID 140064 datatype. The ProductAvailabilityRequirementConfirmationItemUUID 140060 attribute has a cardinality of zero or one 140062 meaning that for each instance of the Item 140054 entity there may be one ProductAvailabilityRequirementConfirmationItemUUID 140060 attribute.

The ID 140066 attribute is a BusinessTransactionDocumentItemID 140070 datatype. The ID 140066 attribute has a cardinality of one 140068 meaning that for each instance of the Item 140054 entity there is one ID 140066 attribute.

The SupplyPlanningAreaID 140072 attribute is a SupplyPlanningAreaID 140076 datatype. The SupplyPlanningAreaID 140072 attribute has a cardinality of zero or one 140074 meaning that for each instance of the Item 140054 entity there may be one SupplyPlanningAreaID 140072 attribute.

The BaseBusinessTransactionDocumentItemTypeCode 140078 attribute is a BusinessTransactionDocumentItemTypeCode 140082 datatype. The BaseBusinessTransactionDocumentItemTypeCode 140078 attribute has a cardinality of zero or one 140080 meaning that for each instance of the Item 140054 entity there may be one BaseBusinessTransactionDocumentItemTypeCode 140078 attribute.

The DistributionChannelCode 140084 attribute is a DistributionChannelCode 140088 datatype. The DistributionChannelCode 140084 attribute has a cardinality of zero or one 140086 meaning that for each instance of the Item 140054 entity there may be one DistributionChannelCode 140084 attribute.

The DivisionCode 140090 attribute is a DivisionCode 140094 datatype. The DivisionCode 140090 attribute has a cardinality of zero or one 140092 meaning that for each instance of the Item 140054 entity there may be one DivisionCode 140090 attribute.

The LogisticsExecutionBlockingReasonCode 140096 attribute is a BlockingReasonCode 1400100 datatype. The LogisticsExecutionBlockingReasonCode 140096 attribute has a cardinality of zero or one 140098 meaning that for each instance of the Item 140054 entity there may be one LogisticsExecutionBlockingReasonCode 140096 attribute.

The CancellationReasonCode 1400102 attribute is a CancellationReasonCode 1400106 datatype. The CancellationReasonCode 1400102 attribute has a cardinality of zero or one 1400104 meaning that for each instance of the Item 140054 entity there may be one CancellationReasonCode 1400102 attribute.

The ProductInformation 1400108 package includes a Product 1400110 entity.

The Product 1400110 entity has a cardinality of one 1400112 meaning that for each instance of the Item 140054 entity there is one Product 1400110 entity. The Product 1400110 entity includes various attributes, namely InternalID 1400116, SellerID 1400122, BuyerID 1400128 and IdentifiedStockID 1400134.

The InternalID 1400116 attribute is a ProductInternalID 1400120 datatype. The InternalID 1400116 attribute has a cardinality of one 1400118 meaning that for each instance of the Product 1400110 entity there is one InternalID 1400116 attribute.

The SellerID 1400122 attribute is a ProductPartyID 1400126 datatype. The SellerID 1400122 attribute has a cardinality of zero or one 1400124 meaning that for each instance of the Product 1400110 entity there may be one SellerID 1400122 attribute.

The BuyerID 1400128 attribute is a ProductPartyID 1400132 datatype. The BuyerID 1400128 attribute has a cardinality of zero or one 1400130 meaning that for each instance of the Product 1400110 entity there may be one BuyerID 1400128 attribute.

The IdentifiedStockID 1400134 attribute is an IdentifiedStockID 1400138 datatype. The IdentifiedStockID 1400134 attribute has a cardinality of zero or one 1400136 meaning that for each instance of the Product 1400110 entity there may be one IdentifiedStockID 1400134 attribute.

The Party 1400140 package includes various entities, namely BuyerParty 1400142, SellerParty 1400154 and ProductRecipientParty 1400166.

The BuyerParty 1400142 entity has a cardinality of zero or one 1400144 meaning that for each instance of the Item 140054 entity there may be one BuyerParty 1400142 entity. The BuyerParty 1400142 entity includes an ID 1400148 attribute.

The ID 1400148 attribute is a PartyID 1400152 datatype. The ID 1400148 attribute has a cardinality of one 1400150 meaning that for each instance of the BuyerParty 1400142 entity there is one ID 1400148 attribute.

The SellerParty 1400154 entity has a cardinality of zero or one 1400156 meaning that for each instance of the Item 140054 entity there may be one SellerParty 1400154 entity. The SellerParty 1400154 entity includes an ID 1400160 attribute.

The ID 1400160 attribute is a PartyID 1400164 datatype. The ID 1400160 attribute has a cardinality of one 1400162 meaning that for each instance of the SellerParty 1400154 entity there is one ID 1400160 attribute.

The ProductRecipientParty 1400166 entity has a cardinality of zero or one 1400168 meaning that for each instance of the Item 140054 entity there may be one ProductRecipientParty 1400166 entity. The ProductRecipientParty 1400166 entity includes an ID 1400172 attribute.

The ID 1400172 attribute is a PartyID 1400176 datatype. The ID 1400172 attribute has a cardinality of one 1400174 meaning that for each instance of the ProductRecipientParty 1400166 entity there is one ID 1400172 attribute.

The Location 1400178 package includes various entities, namely ShipToLocation 1400180 and ShipFromLocation 1400198.

The ShipToLocation 1400180 entity has a cardinality of zero or one 1400182 meaning that for each instance of the Item 140054 entity there may be one ShipToLocation 1400180 entity. The ShipToLocation 1400180 entity includes various attributes, namely BuyerID 1400186 and SellerID 1400192.

The BuyerID 1400186 attribute is a LocationPartyID 1400190 datatype. The BuyerID 1400186 attribute has a cardinality of zero or one 1400188 meaning that for each instance of the ShipToLocation 1400180 entity there may be one BuyerID 1400186 attribute.

The SellerID 1400192 attribute is a LocationPartyID 1400196 datatype. The SellerID 1400192 attribute has a cardinality of zero or one 1400194 meaning that for each instance of the ShipToLocation 1400180 entity there may be one SellerID 1400192 attribute.

The ShipFromLocation 1400198 entity has a cardinality of zero or one 1400200 meaning that for each instance of the Item 140054 entity there may be one ShipFromLocation 1400198 entity. The ShipFromLocation 1400198 entity includes various attributes, namely BuyerID 1400204 and SellerID 1400210.

The BuyerID 1400204 attribute is a LocationPartyID 1400208 datatype. The BuyerID 1400204 attribute has a cardinality of zero or one 1400206 meaning that for each instance of the ShipFromLocation 1400198 entity there may be one BuyerID 1400204 attribute.

The SellerID 1400210 attribute is a LocationPartyID 1400214 datatype. The SellerID 1400210 attribute has a cardinality of zero or one 1400212 meaning that for each instance of the ShipFromLocation 1400198 entity there may be one SellerID 1400210 attribute.

The GroupInformation 1400216 package includes a Group 1400218 entity.

The Group 1400218 entity has a cardinality of zero or one 1400220 meaning that for each instance of the Item 140054 entity there may be one Group 1400218 entity. The Group 1400218 entity includes various attributes, namely ID 1400224 and HierarchyRelationshipTypeCode 1400230.

The ID 1400224 attribute is a BusinessTransactionDocumentItemGroupID 1400228 datatype. The ID 1400224 attribute has a cardinality of one 1400226 meaning that for each instance of the Group 1400218 entity there is one ID 1400224 attribute.

The HierarchyRelationshipTypeCode 1400230 attribute is a BusinessTransactionDocumentItemHierarchyRelationshipTypeCode 1400234 datatype. The HierarchyRelationshipTypeCode 1400230 attribute has a cardinality of zero or one 1400232 meaning that for each instance of the Group 1400218 entity there may be one HierarchyRelationshipTypeCode 1400230 attribute.

The Properties 1400236 package includes a Property 1400238 entity.

The Property 1400238 entity has a cardinality of zero or n 1400240 meaning that for each instance of the Item 140054 entity there may be one or more Property 1400238 entities. The Property 1400238 entity includes various attributes, namely ID 1400244 and Value 1400250.

The ID 1400244 attribute is a PropertyID 1400248 datatype. The ID 1400244 attribute has a cardinality of one 1400246 meaning that for each instance of the Property 1400238 entity there is one ID 1400244 attribute.

The Value 1400250 attribute is a PropertyValue 1400254 datatype. The Value 1400250 attribute has a cardinality of one 1400252 meaning that for each instance of the Property 1400238 entity there is one Value 1400250 attribute.

The DeliveryInformation 1400256 package includes a DeliveryTerms 1400258 entity.

The DeliveryTerms 1400258 entity has a cardinality of zero or one 1400260 meaning that for each instance of the Item 140054 entity there may be one DeliveryTerms 1400258 entity. The DeliveryTerms 1400258 entity includes various attributes, namely PriorityCode 1400264, Incoterms 1400270, PartialDeliveryMaximumNumberValue 1400276, QuantityTolerance 1400282 and PartialDeliveryControlCode 1400288.

The PriorityCode 1400264 attribute is a PriorityCode 1400268 datatype. The PriorityCode 1400264 attribute has a cardinality of zero or one 1400266 meaning that for each instance of the DeliveryTerms 1400258 entity there may be one PriorityCode 1400264 attribute.

The Incoterms 1400270 attribute is an Incoterms 1400274 datatype. The Incoterms 1400270 attribute has a cardinality of zero or one 1400272 meaning that for each instance of the DeliveryTerms 1400258 entity there may be one Incoterms 1400270 attribute.

The PartialDeliveryMaximumNumberValue 1400276 attribute is a NumberValue 1400280 datatype. The PartialDeliveryMaximumNumberValue 1400276 attribute has a cardinality of zero or one 1400278 meaning that for each instance of the DeliveryTerms 1400258 entity there may be one PartialDeliveryMaximumNumberValue 1400276 attribute.

The QuantityTolerance 1400282 attribute is a QuantityTolerance 1400286 datatype. The QuantityTolerance 1400282 attribute has a cardinality of zero or one 1400284 meaning that for each instance of the DeliveryTerms 1400258 entity there may be one QuantityTolerance 1400282 attribute.

The PartialDeliveryControlCode 1400288 attribute is a PartialDeliveryControlCode 1400292 datatype. The PartialDeliveryControlCode 1400288 attribute has a cardinality of zero or one 1400290 meaning that for each instance of the DeliveryTerms 1400258 entity there may be one PartialDeliveryControlCode 1400288 attribute.

The Transportation 1400294 package includes a TransportationTerms 1400296 entity.

The TransportationTerms 1400296 entity has a cardinality of zero or one 1400298 meaning that for each instance of the Item 140054 entity there may be one TransportationTerms 1400296 entity. The TransportationTerms 1400296 entity includes a TransportServiceLevelCode 1400302 attribute.

The TransportServiceLevelCode 1400302 attribute is a TransportServiceLevelCode 1400306 datatype. The TransportServiceLevelCode 1400302 attribute has a cardinality of zero or one 1400304 meaning that for each instance of the TransportationTerms 1400296 entity there may be one TransportServiceLevelCode 1400302 attribute.

The BusinessTransactionDocumentItemReference 1400308 package includes a BaseBusinessTransactionDocumentItemReference 1400310 entity.

The BaseBusinessTransactionDocumentItemReference 1400310 entity has a cardinality of zero or one 1400312 meaning that for each instance of the Item 140054 entity there may be one BaseBusinessTransactionDocumentItemReference 1400310 entity. The BaseBusinessTransactionDocumentItemReference 1400310 entity includes a BusinessTransactionDocumentItemReference 1400316 attribute.

The BusinessTransactionDocumentItemReference 1400316 attribute is a BusinessTransactionDocumentReference 1400320 datatype. The BusinessTransactionDocumentItemReference 1400316 attribute has a cardinality of one 1400318 meaning that for each instance of the BaseBusinessTransactionDocumentItemReference 1400310 entity there is one BusinessTransactionDocumentItemReference 1400316 attribute.

The ScheduleLine 1400322 package includes a ScheduleLine 1400324 entity.

The ScheduleLine 1400324 entity has a cardinality of one or n 1400326 meaning that for each instance of the Item 140054 entity there are one or more ScheduleLine 1400324 entities. The ScheduleLine 1400324 entity includes various attributes, namely ID 1400330 and Quantity 1400336. The ScheduleLine 1400324 entity includes a TimeSegment 1400342 subordinate entity.

The ID 1400330 attribute is a BusinessTransactionDocumentItemScheduleLineID 1400334 datatype. The ID 1400330 attribute has a cardinality of one 1400332 meaning that for each instance of the ScheduleLine 1400324 entity there is one ID 1400330 attribute.

The Quantity 1400336 attribute is a Quantity 1400340 datatype. The Quantity 1400336 attribute has a cardinality of one 1400338 meaning that for each instance of the ScheduleLine 1400324 entity there is one Quantity 1400336 attribute.

The TimeSegment 1400342 entity has a cardinality of one or n 1400344 meaning that for each instance of the ScheduleLine 1400324 entity there are one or more TimeSegment 1400342 entities. The TimeSegment 1400342 entity includes various attributes, namely DateTimePeriod 1400348 and PeriodRoleCode 1400354.

The DateTimePeriod 1400348 attribute is an UPPEROPEN_GLOBAL_DateTimePeriod 1400352 datatype. The DateTimePeriod 1400348 attribute has a cardinality of one 1400350 meaning that for each instance of the TimeSegment 1400342 entity there is one DateTimePeriod 1400348 attribute.

The PeriodRoleCode 1400354 attribute is a PeriodRoleCode 1400358 datatype. The PeriodRoleCode 1400354 attribute has a cardinality of one 1400356 meaning that for each instance of the TimeSegment 1400342 entity there is one PeriodRoleCode 1400354 attribute.

The AvailabilityConfirmation 1400360 package includes an AvailabilityConfirmation 1400362 entity. The AvailabilityConfirmation 1400360 package includes various packages, namely BusinessTransactionDocumentReference 1400374 and Item 1400388.

The AvailabilityConfirmation 1400362 entity has a cardinality of zero or one 1400364 meaning that for each instance of the CustomerRequirement 140008 entity there may be one AvailabilityConfirmation 1400362 entity. The AvailabilityConfirmation 1400362 entity includes a BaseBusinessTransactionDocumentTypeCode 1400368 attribute.

The BaseBusinessTransactionDocumentTypeCode 1400368 attribute is a BusinessTransactionDocumentTypeCode 1400372 datatype. The BaseBusinessTransactionDocumentTypeCode 1400368 attribute has a cardinality of one 1400370 meaning that for each instance of the AvailabilityConfirmation 1400362 entity there is one BaseBusinessTransactionDocumentTypeCode 1400368 attribute.

The BusinessTransactionDocumentReference 1400374 package includes a BaseBusinessTransactionDocumentReference 1400376 entity.

The BaseBusinessTransactionDocumentReference 1400376 entity has a cardinality of zero or one 1400378 meaning that for each instance of the AvailabilityConfirmation 1400362 entity there may be one BaseBusinessTransactionDocumentReference 1400376 entity. The BaseBusinessTransactionDocumentReference 1400376 entity includes an ID 1400382 attribute.

The ID 1400382 attribute is a BusinessTransactionDocumentID 1400386 datatype. The ID 1400382 attribute has a cardinality of one 1400384 meaning that for each instance of the BaseBusinessTransactionDocumentReference 1400376 entity there is one ID 1400382 attribute.

The Item 1400388 package includes an Item 1400390 entity. The Item 1400388 package includes various packages, namely ProductInformation 1400432, Location 1400464, GroupInformation 1400484, BusinessTransactionDocumentItemReference 1400504 and ScheduleLine 1400530.

The Item 1400390 entity has a cardinality of one or n 1400392 meaning that for each instance of the AvailabilityConfirmation 1400362 entity there are one or more Item 1400390 entities. The Item 1400390 entity includes various attributes, namely ProductAvailabilityRequirementConfirmationItemUUID 1400396, ID 1400402, BaseBusinessTransactionDocumentItemTypeCode 1400408, SystemAdministrativeData 1400414, SupplyPlanningAreaID 1400420 and ExternalRequestItemUUID 1400426.

The ProductAvailabilityRequirementConfirmationItemUUID 1400396 attribute is an UUID 1400400 datatype. The ProductAvailabilityRequirementConfirmationItemUUID 1400396 attribute has a cardinality of zero or one 1400398 meaning that for each instance of the Item 1400390 entity there may be one ProductAvailabilityRequirementConfirmationItemUUID 1400396 attribute.

The ID 1400402 attribute is a BusinessTransactionDocumentItemID 1400406 datatype. The ID 1400402 attribute has a cardinality of one 1400404 meaning that for each instance of the Item 1400390 entity there is one ID 1400402 attribute.

The BaseBusinessTransactionDocumentItemTypeCode 1400408 attribute is a BusinessTransactionDocumentItemTypeCode 1400412 datatype. The BaseBusinessTransactionDocumentItemTypeCode 1400408 attribute has a cardinality of zero or one 1400410 meaning that for each instance of the Item 1400390 entity there may be one BaseBusinessTransactionDocumentItemTypeCode 1400408 attribute.

The SystemAdministrativeData 1400414 attribute is a SystemAdministrativeData 1400418 datatype. The SystemAdministrativeData 1400414 attribute has a cardinality of one 1400416 meaning that for each instance of the Item 1400390 entity there is one SystemAdministrativeData 1400414 attribute.

The SupplyPlanningAreaID 1400420 attribute is a SupplyPlanningAreaID 1400424 datatype. The SupplyPlanningAreaID 1400420 attribute has a cardinality of zero or one 1400422 meaning that for each instance of the Item 1400390 entity there may be one SupplyPlanningAreaID 1400420 attribute.

The ExternalRequestItemUUID 1400426 attribute is an UUID 1400430 datatype. The ExternalRequestItemUUID 1400426 attribute has a cardinality of one 1400428 meaning that for each instance of the Item 1400390 entity there is one ExternalRequestItemUUID 1400426 attribute.

The ProductInformation 1400432 package includes a Product 1400434 entity.

The Product 1400434 entity has a cardinality of one 1400436 meaning that for each instance of the Item 1400390 entity there is one Product 1400434 entity. The Product 1400434 entity includes various attributes, namely InternalID 1400440, SellerID 1400446, BuyerID 1400452 and IdentifiedStockID 1400458.

The InternalID 1400440 attribute is a ProductInternalID 1400444 datatype. The InternalID 1400440 attribute has a cardinality of one 1400442 meaning that for each instance of the Product 1400434 entity there is one InternalID 1400440 attribute.

The SellerID 1400446 attribute is a ProductPartyID 1400450 datatype. The SellerID 1400446 attribute has a cardinality of zero or one 1400448 meaning that for each instance of the Product 1400434 entity there may be one SellerID 1400446 attribute.

The BuyerID 1400452 attribute is a ProductPartyID 1400456 datatype. The BuyerID 1400452 attribute has a cardinality of zero or one 1400454 meaning that for each instance of the Product 1400434 entity there may be one BuyerID 1400452 attribute.

The IdentifiedStockID 1400458 attribute is an IdentifiedStockID 1400462 datatype. The IdentifiedStockID 1400458 attribute has a cardinality of zero or one 1400460 meaning that for each instance of the Product 1400434 entity there may be one IdentifiedStockID 1400458 attribute.

The Location 1400464 package includes a ShipFromLocation 1400466 entity.

The ShipFromLocation 1400466 entity has a cardinality of one 1400468 meaning that for each instance of the Item 1400390 entity there is one ShipFromLocation 1400466 entity. The ShipFromLocation 1400466 entity includes various attributes, namely BuyerID 1400472 and SellerID 1400478.

The BuyerID 1400472 attribute is a LocationPartyID 1400476 datatype. The BuyerID 1400472 attribute has a cardinality of zero or one 1400474 meaning that for each instance of the ShipFromLocation 1400466 entity there may be one BuyerID 1400472 attribute.

The SellerID 1400478 attribute is a LocationPartyID 1400482 datatype. The SellerID 1400478 attribute has a cardinality of zero or one 1400480 meaning that for each instance of the ShipFromLocation 1400466 entity there may be one SellerID 1400478 attribute.

The GroupInformation 1400484 package includes a Group 1400486 entity.

The Group 1400486 entity has a cardinality of zero or one 1400488 meaning that for each instance of the Item 1400390 entity there may be one Group 1400486 entity. The Group 1400486 entity includes various attributes, namely ID 1400492 and HierarchyRelationshipTypeCode 1400498.

The ID 1400492 attribute is a BusinessTransactionDocumentItemGroupID 1400496 datatype. The ID 1400492 attribute has a cardinality of one 1400494 meaning that for each instance of the Group 1400486 entity there is one ID 1400492 attribute.

The HierarchyRelationshipTypeCode 1400498 attribute is a BusinessTransactionDocumentItemHierarchyRelationshipTypeCode 1400502 datatype. The HierarchyRelationshipTypeCode 1400498 attribute has a cardinality of zero or one 1400500 meaning that for each instance of the Group 1400486 entity there may be one HierarchyRelationshipTypeCode 1400498 attribute.

The BusinessTransactionDocumentItemReference 1400504 package includes various entities, namely BaseBusinessTransactionDocumentItemReference 1400506 and OutboundDeliveryReference 1400518.

The BaseBusinessTransactionDocumentItemReference 1400506 entity has a cardinality of zero or one 1400508 meaning that for each instance of the Item 1400390 entity there may be one BaseBusinessTransactionDocumentItemReference 1400506 entity. The BaseBusinessTransactionDocumentItemReference 1400506 entity includes a BusinessTransactionDocumentItemReference 1400512 attribute.

The BusinessTransactionDocumentItemReference 1400512 attribute is a BusinessTransactionDocumentReference 1400516 datatype. The BusinessTransactionDocumentItemReference 1400512 attribute has a cardinality of one 1400514 meaning that for each instance of the BaseBusinessTransactionDocumentItemReference 1400506 entity there is one BusinessTransactionDocumentItemReference 1400512 attribute.

The OutboundDeliveryReference 1400518 entity has a cardinality of zero or one 1400520 meaning that for each instance of the Item 1400390 entity there may be one OutboundDeliveryReference 1400518 entity. The OutboundDeliveryReference 1400518 entity includes a BusinessTransactionDocumentItemReference 1400524 attribute.

The BusinessTransactionDocumentItemReference 1400524 attribute is a BusinessTransactionDocumentReference 1400528 datatype. The BusinessTransactionDocumentItemReference 1400524 attribute has a cardinality of one 1400526 meaning that for each instance of the OutboundDeliveryReference 1400518 entity there is one BusinessTransactionDocumentItemReference 1400524 attribute.

The ScheduleLine 1400530 package includes a ScheduleLine 1400532 entity.

The ScheduleLine 1400532 entity has a cardinality of one or n 1400534 meaning that for each instance of the Item 1400390 entity there are one or more ScheduleLine 1400532 entities. The ScheduleLine 1400532 entity includes various attributes, namely ID 1400538 and Quantity 1400544. The ScheduleLine 1400532 entity includes a TimeSegment 1400550 subordinate entity.

The ID 1400538 attribute is a BusinessTransactionDocumentItemScheduleLineID 1400542 datatype. The ID 1400538 attribute has a cardinality of one 1400540 meaning that for each instance of the ScheduleLine 1400532 entity there is one ID 1400538 attribute.

The Quantity 1400544 attribute is a Quantity 1400548 datatype. The Quantity 1400544 attribute has a cardinality of one 1400546 meaning that for each instance of the ScheduleLine 1400532 entity there is one Quantity 1400544 attribute.

The TimeSegment 1400550 entity has a cardinality of one or n 1400552 meaning that for each instance of the ScheduleLine 1400532 entity there are one or more TimeSegment 1400550 entities. The TimeSegment 1400550 entity includes various attributes, namely DateTimePeriod 1400556 and PeriodRoleCode 1400562.

The DateTimePeriod 1400556 attribute is an UPPEROPEN_GLOBAL_DateTimePeriod 1400560 datatype. The DateTimePeriod 1400556 attribute has a cardinality of one 1400558 meaning that for each instance of the TimeSegment 1400550 entity there is one DateTimePeriod 1400556 attribute.

The PeriodRoleCode 1400562 attribute is a PeriodRoleCode 1400566 datatype. The PeriodRoleCode 1400562 attribute has a cardinality of one 1400564 meaning that for each instance of the TimeSegment 1400550 entity there is one PeriodRoleCode 1400562 attribute.

The Log 1400568 package is a Log 1400574 datatype. The Log 1400568 package includes a Log 1400570 entity.

The Log 1400570 entity has a cardinality of one 1400572 meaning that for each instance of the CustomerRequirementByIDResponseMessage_sync 140002 entity there is one Log 1400570 entity.

CustomerRequirement Package

The CustomerRequirement package groups the entity CustomerRequirement with its packages ExternalRequest and AvailabilityConfirmation. ExternalRequest is a requirement containing the quantities required of specific products as well as the dates at which they are required. AvailabilityConfirmation is a confirmation of the available quantities of the products or suitable substitute products, the location in which they are available as well as the dates at which they are available.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

ExternalRequest Package

The ExternalRequest package groups the entity ExternalRequest with its packages BusinessTransactionDocumentReference and Item. BusinessTransactionDocumentReference contains the reference to a related business transaction document. Item contains all the item related data of an ExternalRequest.

ExternalRequest

ExternalRequest is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

BusinessTransactionDocumentReference Package

BaseBusinessTransactionDocumentReference

A BaseBusinessTransactionDocumentReference is a reference to the business trans-action document from which the ExternalRequest was derived.

Item Package

The Item package groups the entity Item with its packages ProductInformation, Party, Location, GroupInformation, Properties, DeliveryInformation, TransportInformation, BusinessTransactionDocumentReference, and ScheduleLine. ProductInformation contains the information about the requested product. Party contains the information about the parties that participate in an Item.

Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved. ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the buyer. IdentifiedStockID (optional) is the unique identifier of the product batch.

Party Package

BuyerParty

A BuyerParty is a party that buys a product of an Item. ID is the identifier of the Buyer within the CustomerRequirement.

SellerParty

A SellerParty is a party that sells a product of an Item. ID is the identifier of the Seller within the CustomerRequirement.

ProductRecipientParty

A ProductRecipientParty is a party to which a product of an Item is delivered. ID is the identifier of the ProductRecipient within the CustomerRequirement.

Location Package

ShipToLocation

A ShipToLocation is a location to which goods are shipped. BuyerID (optional) is the identification of the ShipToLocation that is specified by the product buyer. SellerID (optional) is the identification of the ShipToLocation that is specified by the product seller. One of the IDs (either BuyerID or SellerID) can be filled with value. The interface evaluates the values in sequence 'BuyerID, SellerID' and uses the first found one.

ShipFromLocation

ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

Properties Package

Property

A Property is a consumer specific condition for execution of an availability check for an Item. The properties are also used in an availability check that can be optionally executed before the CustomerRequirement is stored. ID is the identification of the property. Value is the value of the property.

DeliveryInformation Package

DeliveryTerms

DeliveryTerms are the item-specific conditions and agreements that are valid for shipment or for the services and activities required for shipment. PriorityCode (optional) is the priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package

BaseBusinessTransactionDocumentItemReference

BaseBusinessTransactionDocumentItemReference is a unique reference to an item of a business document from which the ExternalRequest was derived. BusinessTransactionDocumentItemReference is the identifier of the referenced item of a business document.

ScheduleLine Package

ScheduleLine

The ScheduleLine is a schedule line for an Item. It contains information about when and how much of the product defined in the higher-level item is requested. ID is the unique identifier of the schedule line in a Item. Quantity is the requested quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

AvailabilityConfirmation Package

The AvailabilityConfirmation package groups the entity AvailabilityConfirmation with its packages BusinessTransactionDocumentReference and Item. BusinessTransactionDocumentReference contains the reference to a related business transaction document. Item contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

BusinessTransactionDocumentReference Package

BaseBusinessTransactionDocumentReference

A BaseBusinessTransactionDocumentReference is a reference to the business trans-action document from which the AvailabilityConfirmation was derived.

Item Package

The Item package groups the entity Item with its packages ProductInformation, Party, Location, GroupInformation, BusinessTransactionDocumentReference, and ScheduleLine. ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business transaction document item. ScheduleLine contains the schedule lines of the Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem. ExternalRequestItemUUID is the reference to the ExternalRequestItem for which this confirmation item is valid.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package

ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentReference Package

BaseBusinessTransactionDocumentItemReference

BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package

ScheduleLine

The ScheduleLine is a schedule line for an item of an AvailabilityConfirmation. It describes the date and quantity in which the confirmed product is desired or expected to be provided or shipped. ID is the unique identifier of the schedule line in an Item. Quantity is the confirmed quantity. An Item can contain a schedule line with material provision date as well as a schedule line with delivery date.

TimeSegment

The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Log Package

The log package groups the log information sent by Location Data Processing.

Log

The entity Log contains the information about the execution of an action.

Message Data Type

The message data type CustomerRequirementExternalRequestItemCreateRequestMessage_sync contains the CustomerRequirement included in the business document and the message data type CustomerRequirementExternalRequestItemCreateRequestMessage_sync. CustomerRequirementExternalRequestItemCreateRequestMessage_sync, therefore, provides the structure for the message type CustomerRequirementExternalRequestItemCreateRequest_sync and the interface that is based on it. FIGS. 148-1 through 148-12 show a CustomerRequirementExternalRequestItemCreateRequestMessage_sync 148000 package. The CustomerRequirementExternalRequestItemCreateRequestMessage_sync 148000 package is a CustomerRequirementCreateRequestMessage_sync 148004 datatype. The CustomerRequirementExternalRequestItemCreateRequestMessage_sync 148000 package includes a CustomerRequirementExternalRequestItemCreateRequestMessage_sync 148002 entity. The CustomerRequirementExternalRequestItemCreateRequestMessage_sync 148000 package includes a CustomerRequirement 148006 package.

The CustomerRequirement 148006 package includes a CustomerRequirement 148008 entity. The CustomerRequirement 148006 package includes an ExternalRequest 148024 package.

The CustomerRequirement 148008 entity has a cardinality of one 148010 meaning that for each instance of the CustomerRequirementExternalRequestItemCreateRequestMessage_sync 148002 entity there is one CustomerRequirement 148008 entity. The CustomerRequirement 148008 entity includes various attributes, namely ID 148012 and SystemAdministrativeData 148018.

The ID 148012 attribute is a BusinessTransactionDocumentID 148016 datatype. The ID 148012 attribute has a cardinality of one 148014 meaning that for each instance of the CustomerRequirement 148008 entity there is one ID 148012 attribute.

The SystemAdministrativeData 148018 attribute is a SystemAdministrativeData 148022 datatype. The SystemAdministrativeData 148018 attribute has a cardinality of one 148020 meaning that for each instance of the CustomerRequirement 148008 entity there is one SystemAdministrativeData 148018 attribute.

The ExternalRequest 148024 package includes an ExternalRequest 148026 entity. The ExternalRequest 148024 package includes various packages, namely BusinessTransactionDocumentReference 148038 and Item 148052.

The ExternalRequest 148026 entity has a cardinality of one 148028 meaning that for each instance of the CustomerRequirement 148008 entity there is one ExternalRequest 148026 entity. The ExternalRequest 148026 entity includes a BaseBusinessTransactionDocumentTypeCode 148032 attribute.

The BaseBusinessTransactionDocumentTypeCode 148032 attribute is a BusinessTransactionDocumentTypeCode 148036 datatype. The BaseBusinessTransactionDocumentTypeCode 148032 attribute has a cardinality of one 148034 meaning that for each instance of the ExternalRequest 148026 entity there is one BaseBusinessTransactionDocumentTypeCode 148032 attribute.

The BusinessTransactionDocumentReference 148038 package includes a BaseBusinessTransactionDocumentReference 148040 entity.

The BaseBusinessTransactionDocumentReference 148040 entity has a cardinality of zero or one 148042 meaning that for each instance of the ExternalRequest 148026 entity there may be one BaseBusinessTransactionDocumentReference 148040 entity. The BaseBusinessTransactionDocumentReference 148040 entity includes an ID 148046 attribute.

The ID 148046 attribute is a BusinessTransactionDocumentID 148050 datatype. The ID 148046 attribute has a cardinality of one 148048 meaning that for each instance of the BaseBusinessTransactionDocumentReference 148040 entity there is one ID 148046 attribute.

The Item 148052 package includes an Item 148054 entity. The Item 148052 package includes various packages, namely ProductInformation 1480108, Party 1480140, Location 1480178, GroupInformation 1480216, Properties 1480236, DeliveryInformation 1480256, Transportation 1480294, BusinessTransactionDocumentItemReference 1480308 and ScheduleLine 1480322.

The Item 148054 entity has a cardinality of one 148056 meaning that for each instance of the ExternalRequest 148026 entity there is one Item 148054 entity. The Item 148054 entity includes various attributes, namely ProductAvailabilityRequirementConfirmationItemUUID 148060, ID 148066, SupplyPlanningAreaID 148072, BaseBusinessTransactionDocumentItemTypeCode 148078, DistributionChannelCode 148084, DivisionCode 148090, LogisticsExecutionBlockingReasonCode 148096 and CancellationReasonCode 1480102.

The ProductAvailabilityRequirementConfirmationItemUUID 148060 attribute is an UUID 148064 datatype. The ProductAvailabilityRequirementConfirmationItemUUID 148060 attribute has a cardinality of zero or one 148062 meaning that for each instance of the Item 148054 entity there may be one ProductAvailabilityRequirementConfirmationItemUUID 148060 attribute.

The ID 148066 attribute is a BusinessTransactionDocumentItemID 148070 datatype. The ID 148066 attribute has a cardinality of one 148068 meaning that for each instance of the Item 148054 entity there is one ID 148066 attribute.

The SupplyPlanningAreaID 148072 attribute is a SupplyPlanningAreaID 148076 datatype. The SupplyPlanningAreaID 148072 attribute has a cardinality of zero or one 148074 meaning that for each instance of the Item 148054 entity there may be one SupplyPlanningAreaID 148072 attribute.

The BaseBusinessTransactionDocumentItemTypeCode 148078 attribute is a BusinessTransactionDocumentItemTypeCode 148082 datatype. The BaseBusinessTransactionDocumentItemTypeCode 148078 attribute has a cardinality of zero or one 148080 meaning that for each instance of the Item 148054 entity there may be one BaseBusinessTransactionDocumentItemTypeCode 148078 attribute.

The DistributionChannelCode 148084 attribute is a DistributionChannelCode 148088 datatype. The DistributionChannelCode 148084 attribute has a cardinality of zero or one 148086 meaning that for each instance of the Item 148054 entity there may be one DistributionChannelCode 148084 attribute.

The DivisionCode 148090 attribute is a DivisionCode 148094 datatype. The DivisionCode 148090 attribute has a cardinality of zero or one 148092 meaning that for each instance of the Item 148054 entity there may be one DivisionCode 148090 attribute.

The LogisticsExecutionBlockingReasonCode 148096 attribute is a BlockingReasonCode 1480100 datatype. The LogisticsExecutionBlockingReasonCode 148096 attribute has a cardinality of zero or one 148098 meaning that for each instance of the Item 148054 entity there may be one LogisticsExecutionBlockingReasonCode 148096 attribute.

The CancellationReasonCode 1480102 attribute is a CancellationReasonCode 1480106 datatype. The CancellationReasonCode 1480102 attribute has a cardinality of zero or one 1480104 meaning that for each instance of the Item 148054 entity there may be one CancellationReasonCode 1480102 attribute.

The ProductInformation 1480108 package includes a Product 1480110 entity.

The Product 1480110 entity has a cardinality of one 1480112 meaning that for each instance of the Item 148054 entity there is one Product 1480110 entity. The Product 1480110 entity includes various attributes, namely InternalID 1480116, SellerID 1480122, BuyerID 1480128 and IdentifiedStockID 1480134.

The InternalID 1480116 attribute is a ProductInternalID 1480120 datatype. The InternalID 1480116 attribute has a cardinality of one 1480118 meaning that for each instance of the Product 1480110 entity there is one InternalID 1480116 attribute.

The SellerID 1480122 attribute is a ProductPartyID 1480126 datatype. The SellerID 1480122 attribute has a cardinality of zero or one 1480124 meaning that for each instance of the Product 1480110 entity there may be one SellerID 1480122 attribute.

The BuyerID 1480128 attribute is a ProductPartyID 1480132 datatype. The BuyerID 1480128 attribute has a cardinality of zero or one 1480130 meaning that for each instance of the Product 1480110 entity there may be one BuyerID 1480128 attribute.

The IdentifiedStockID 1480134 attribute is an IdentifiedStockID 1480138 datatype. The IdentifiedStockID 1480134 attribute has a cardinality of zero or one 1480136 meaning that for each instance of the Product 1480110 entity there may be one IdentifiedStockID 1480134 attribute.

The Party 1480140 package includes various entities, namely BuyerParty 1480142, SellerParty 1480154 and ProductRecipientParty 1480166.

The BuyerParty 1480142 entity has a cardinality of zero or one 1480144 meaning that for each instance of the Item 148054 entity there may be one BuyerParty 1480142 entity. The BuyerParty 1480142 entity includes an ID 1480148 attribute.

The ID 1480148 attribute is a PartyID 1480152 datatype. The ID 1480148 attribute has a cardinality of one 1480150 meaning that for each instance of the BuyerParty 1480142 entity there is one ID 1480148 attribute.

The SellerParty 1480154 entity has a cardinality of zero or one 1480156 meaning that for each instance of the Item 148054 entity there may be one SellerParty 1480154 entity. The SellerParty 1480154 entity includes an ID 1480160 attribute.

The ID 1480160 attribute is a PartyID 1480164 datatype. The ID 1480160 attribute has a cardinality of one 1480162 meaning that for each instance of the SellerParty 1480154 entity there is one ID 1480160 attribute.

The ProductRecipientParty 1480166 entity has a cardinality of zero or one 1480168 meaning that for each instance of the Item 148054 entity there may be one ProductRecipientParty 1480166 entity. The ProductRecipientParty 1480166 entity includes an ID 1480172 attribute.

The ID 1480172 attribute is a PartyID 1480176 datatype. The ID 1480172 attribute has a cardinality of one 1480174 meaning that for each instance of the ProductRecipientParty 1480166 entity there is one ID 1480172 attribute.

The Location 1480178 package includes various entities, namely ShipToLocation 1480180 and ShipFromLocation 1480198.

The ShipToLocation 1480180 entity has a cardinality of zero or one 1480182 meaning that for each instance of the Item 148054 entity there may be one ShipToLocation 1480180 entity. The ShipToLocation 1480180 entity includes various attributes, namely BuyerID 1480186 and SellerID 1480192.

The BuyerID 1480186 attribute is a LocationPartyID 1480190 datatype. The BuyerID 1480186 attribute has a cardinality of zero or one 1480188 meaning that for each instance of the ShipToLocation 1480180 entity there may be one BuyerID 1480186 attribute.

The SellerID 1480192 attribute is a LocationPartyID 1480196 datatype. The SellerID 1480192 attribute has a cardinality of zero or one 1480194 meaning that for each instance of the ShipToLocation 1480180 entity there may be one SellerID 1480192 attribute.

The ShipFromLocation 1480198 entity has a cardinality of zero or one 1480200 meaning that for each instance of the Item 148054 entity there may be one ShipFromLocation 1480198 entity. The ShipFromLocation 1480198 entity includes various attributes, namely BuyerID 1480204 and SellerID 1480210.

The BuyerID 1480204 attribute is a LocationPartyID 1480208 datatype. The BuyerID 1480204 attribute has a cardinality of zero or one 1480206 meaning that for each instance of the ShipFromLocation 1480198 entity there may be one BuyerID 1480204 attribute.

The SellerID 1480210 attribute is a LocationPartyID 1480214 datatype. The SellerID 1480210 attribute has a cardinality of zero or one 1480212 meaning that for each instance of the ShipFromLocation 1480198 entity there may be one SellerID 1480210 attribute.

The GroupInformation 1480216 package includes a Group 1480218 entity.

The Group 1480218 entity has a cardinality of zero or one 1480220 meaning that for each instance of the Item 148054 entity there may be one Group 1480218 entity. The Group 1480218 entity includes various attributes, namely ID 1480224 and HierarchyRelationshipTypeCode 1480230.

The ID 1480224 attribute is a BusinessTransactionDocumentItemGroupID 1480228 datatype. The ID 1480224 attribute has a cardinality of one 1480226 meaning that for each instance of the Group 1480218 entity there is one ID 1480224 attribute.

The HierarchyRelationshipTypeCode 1480230 attribute is a BusinessTransactionDocumentItemHierarchyRelationshipTypeCode 1480234 datatype. The HierarchyRelationshipTypeCode 1480230 attribute has a cardinality of zero or one 1480232 meaning that for each instance of the Group 1480218 entity there may be one HierarchyRelationshipTypeCode 1480230 attribute.

The Properties 1480236 package includes a Property 1480238 entity.

The Property 1480238 entity has a cardinality of zero or n 1480240 meaning that for each instance of the Item 148054 entity there may be one or more Property 1480238 entities. The Property 1480238 entity includes various attributes, namely ID 1480244 and Value 1480250.

The ID 1480244 attribute is a PropertyID 1480248 datatype. The ID 1480244 attribute has a cardinality of one 1480246 meaning that for each instance of the Property 1480238 entity there is one ID 1480244 attribute.

The Value 1480250 attribute is a PropertyValue 1480254 datatype. The Value 1480250 attribute has a cardinality of one 1480252 meaning that for each instance of the Property 1480238 entity there is one Value 1480250 attribute.

The DeliveryInformation 1480256 package includes a DeliveryTerms 1480258 entity.

The DeliveryTerms 1480258 entity has a cardinality of zero or one 1480260 meaning that for each instance of the Item 148054 entity there may be one DeliveryTerms 1480258 entity. The DeliveryTerms 1480258 entity includes various attributes, namely PriorityCode 1480264, Incoterms 1480270, PartialDeliveryMaximumNumberValue 1480276, QuantityTolerance 1480282 and PartialDeliveryControlCode 1480288.

The PriorityCode 1480264 attribute is a PriorityCode 1480268 datatype. The PriorityCode 1480264 attribute has a cardinality of zero or one 1480266 meaning that for each instance of the DeliveryTerms 1480258 entity there may be one PriorityCode 1480264 attribute.

The Incoterms 1480270 attribute is an Incoterms 1480274 datatype. The Incoterms 1480270 attribute has a cardinality of zero or one 1480272 meaning that for each instance of the DeliveryTerms 1480258 entity there may be one Incoterms 1480270 attribute.

The PartialDeliveryMaximumNumberValue 1480276 attribute is a NumberValue 1480280 datatype. The PartialDeliveryMaximumNumberValue 1480276 attribute has a cardinality of zero or one 1480278 meaning that for each instance of the DeliveryTerms 1480258 entity there may be one PartialDeliveryMaximumNumberValue 1480276 attribute.

The QuantityTolerance 1480282 attribute is a QuantityTolerance 1480286 datatype. The QuantityTolerance 1480282 attribute has a cardinality of zero or one 1480284 meaning that for each instance of the DeliveryTerms 1480258 entity there may be one QuantityTolerance 1480282 attribute.

The PartialDeliveryControlCode 1480288 attribute is a PartialDeliveryControlCode 1480292 datatype. The PartialDeliveryControlCode 1480288 attribute has a cardinality of zero or one 1480290 meaning that for each instance of the DeliveryTerms 1480258 entity there may be one PartialDeliveryControlCode 1480288 attribute.

The Transportation 1480294 package includes a TransportationTerms 1480296 entity.

The TransportationTerms 1480296 entity has a cardinality of zero or one 1480298 meaning that for each instance of the Item 148054 entity there may be one TransportationTerms 1480296 entity. The TransportationTerms 1480296 entity includes a TransportServiceLevelCode 1480302 attribute.

The TransportServiceLevelCode 1480302 attribute is a TransportServiceLevelCode 1480306 datatype. The TransportServiceLevelCode 1480302 attribute has a cardinality of zero or one 1480304 meaning that for each instance of the TransportationTerms 1480296 entity there may be one TransportServiceLevelCode 1480302 attribute.

The BusinessTransactionDocumentItemReference 1480308 package includes a BaseBusinessTransactionDocumentItemReference 1480310 entity.

The BaseBusinessTransactionDocumentItemReference 1480310 entity has a cardinality of zero or one 1480312 meaning that for each instance of the Item 148054 entity there may be one BaseBusinessTransactionDocumentItemReference 1480310 entity. The BaseBusinessTransactionDocumentItemReference 1480310 entity includes a BusinessTransactionDocumentItemReference 1480316 attribute.

The BusinessTransactionDocumentItemReference 1480316 attribute is a BusinessTransactionDocumentReference 1480320 datatype. The BusinessTransactionDocumentItemReference 1480316 attribute has a cardinality of one 1480318 meaning that for each instance of the BaseBusinessTransactionDocumentItemReference 1480310 entity there is one BusinessTransactionDocumentItemReference 1480316 attribute.

The ScheduleLine 1480322 package includes a ScheduleLine 1480324 entity.

The ScheduleLine 1480324 entity has a cardinality of one or n 1480326 meaning that for each instance of the Item 148054 entity there are one or more ScheduleLine 1480324 entities. The ScheduleLine 1480324 entity includes various attributes, namely ID 1480330 and Quantity 1480336. The ScheduleLine 1480324 entity includes a TimeSegment 1480342 subordinate entity.

The ID 1480330 attribute is a BusinessTransactionDocumentItemScheduleLineID 1480334 datatype. The ID 1480330 attribute has a cardinality of one 1480332 meaning that for each instance of the ScheduleLine 1480324 entity there is one ID 1480330 attribute.

The Quantity 1480336 attribute is a Quantity 1480340 datatype. The Quantity 1480336 attribute has a cardinality of one 1480338 meaning that for each instance of the ScheduleLine 1480324 entity there is one Quantity 1480336 attribute.

The TimeSegment 1480342 entity has a cardinality of one or n 1480344 meaning that for each instance of the ScheduleLine 1480324 entity there are one or more TimeSegment 1480342 entities. The TimeSegment 1480342 entity includes various attributes, namely DateTimePeriod 1480348 and PeriodRoleCode 1480354.

The DateTimePeriod 1480348 attribute is an UPPEROPEN_GLOBAL_DateTimePeriod 1480352 datatype. The DateTimePeriod 1480348 attribute has a cardinality of one 1480350 meaning that for each instance of the TimeSegment 1480342 entity there is one DateTimePeriod 1480348 attribute.

The PeriodRoleCode 1480354 attribute is a PeriodRoleCode 1480358 datatype. The PeriodRoleCode 1480354 attribute has a cardinality of one 1480356 meaning that for each instance of the TimeSegment 1480342 entity there is one PeriodRoleCode 1480354 attribute.

CustomerRequirement Package

The CustomerRequirement package groups the entity CustomerRequirement with its package. ExternalRequest is a requirement containing the quantities required of specific products as well as the dates at which they are required.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

ExternalRequest Package

The ExternalRequest package groups the entity ExternalRequest with its package. Item contains all the item related data of an ExternalRequest.

ExternalRequest

ExternalRequest is the requirement that is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

Item Package

The Item package groups the entity Item with its packages ProductInformation, Party, Location, GroupInformation, Properties, DeliveryInformation, TransportInformation, BusinessTransactionDocumentReference, and ScheduleLine. ProductInformation contains the information about the requested product. Party contains the information about the parties that participate in an Item. Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved. ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the buyer. IdentifiedStockID (optional) is the unique identifier of the product batch.

Party Package

BuyerParty

A BuyerParty is a party that buys a product of an Item. ID is the identifier of the Buyer within the CustomerRequirement.

SellerParty

A SellerParty is a party that sells a product of an Item. ID is the identifier of the Seller within the CustomerRequirement.

ProductRecipientParty

A ProductRecipientParty is a party to which a product of an Item is delivered. ProductRecipientParty contains the element ID. ID is the identifier of the ProductRecipient within the CustomerRequirement.

Location Package

ShipToLocation

A ShipToLocation is a location to which goods are shipped. BuyerID (optional) is the identification of the ShipToLocation that is specified by the product buyer. SellerID (optional) is the identification of the ShipToLocation that is specified by the product seller. One of the IDs (either BuyerID or SellerID) can be filled with value. The interface evaluates the values in sequence 'BuyerID, SellerID' and uses the first found one.

ShipFromLocation

ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

Group is a reference to a collection of requirement items with a special business flavour, for example a delivery group or a MultiItemSingleDeliveryLocation group. The group describes how the items of the group depend on each other. ID is the identification of the item group. ID HierarchyRelationshipTypeCode (optional) is the type of relationship between the items in the item group.

Properties Package

Property

A Property is a consumer specific condition for execution of an availability check for an Item. The properties are also used in an availability check that can be optionally executed before the CustomerRequirement is stored. ID is the identification of the property. Value is the value of the property.

DeliveryInformation Package

DeliveryTerms

DeliveryTerms are the item-specific conditions and agreements that are valid for shipment or for the services and activities required for shipment. PriorityCode (optional) is the priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package

BaseBusinessTransactionDocumentItemReference

BaseBusinessTransactionDocumentItemReference is a unique reference to an item of a business document from which the ExternalRequest was derived. BusinessTransactionDocumentItemReference is the identifier of the referenced item of a business document.

ScheduleLine Package

ScheduleLine

The ScheduleLine is a schedule line for an Item. It contains information about when and how much of the product defined in the higher-level item is requested. ID is the unique identifier of the schedule line in a Item. Quantity is the requested quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Message Data Type

The message data type CustomerRequirementExternalRequestItemConfirmationMessage_sync contains the ID of the CustomerRequirement included in the business document. The message data type CustomerRequirementExternalRequestItemConfirmationMessage_sync, therefore, provides the structure for the message types CustomerRequirementExternalRequestItemCreateConfirmation_sync, CustomerRequirementExternalRequestItemChangeConfirmation_sync and CustomerRequirementCancelExternalRequestItemConfirmation_sync and the interfaces that are based on it. FIGS. 147-1 through 147-2 show a CustomerRequirementExternalRequestItemConfirmationMessage_sync 147000 package. The CustomerRequirementExternalRequestItemConfirmation Message_sync 147000 package is a CustomerRequirementCreateRequestMessage_sync 147004 datatype. The CustomerRequirementExternalRequestItemConfirmationMessage_sync 147000 package includes a CustomerRequirementExternalRequestItemConfirmationMessage_sync 147002 entity. The CustomerRequirementExternalRequestItemConfirmationMessage_sync 147000 package includes various packages, namely CustomerRequirement 147006 and Log 147046.

The CustomerRequirement 147006 package includes a CustomerRequirement 147008 entity. The CustomerRequirement 147006 package includes an ExternalRequest 147018 package.

The CustomerRequirement 147008 entity has a cardinality of one 147010 meaning that for each instance of the CustomerRequirementExternalRequestItemConfirmationMessage_sync 147002 entity there is one CustomerRequirement 147008 entity. The CustomerRequirement 147008 entity includes an ID 147012 attribute.

The ID 147012 attribute is a BusinessTransactionDocumentID 147016 datatype. The ID 147012 attribute has a cardinality of one 147014 meaning that for each instance of the CustomerRequirement 147008 entity there is one ID 147012 attribute.

The ExternalRequest 147018 package includes an ExternalRequest 147020 entity. The ExternalRequest 147018 package includes an Item 147032 package.

The ExternalRequest 147020 entity has a cardinality of one 147022 meaning that for each instance of the CustomerRequirement 147008 entity there is one ExternalRequest 147020 entity. The ExternalRequest 147020 entity includes a BaseBusinessTransactionDocumentTypeCode 147026 attribute.

The BaseBusinessTransactionDocumentTypeCode 147026 attribute is a BusinessTransactionDocumentTypeCode 147030 datatype. The BaseBusinessTransactionDocumentTypeCode 147026 attribute has a cardinality of one 147028 meaning that for each instance of the ExternalRequest 147020 entity there is one BaseBusinessTransactionDocumentTypeCode 147026 attribute.

The Item 147032 package includes an Item 147034 entity.

The Item 147034 entity has a cardinality of one 147036 meaning that for each instance of the ExternalRequest 147020 entity there is one Item 147034 entity. The Item 147034 entity includes an ID 147040 attribute.

The ID 147040 attribute is a BusinessTransactionDocumentItemID 147044 datatype. The ID 147040 attribute has a cardinality of one 147042 meaning that for each instance of the Item 147034 entity there is one ID 147040 attribute.

The Log 147046 package is a Log 147052 datatype. The Log 147046 package includes a Log 147048 entity.

The Log 147048 entity has a cardinality of one 147050 meaning that for each instance of the CustomerRequirementExternalRequestItemConfirmationMessage_sync 147002 entity there is one Log 147048 entity.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

ExternalRequest

ExternalRequest is the requirement that is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

Item

An Item is the request to provide or deliver a product at a certain date and, together with the product, it describes the transport and delivery agreements. It also describes the data that is valid for an item of the ExternalRequest to the parties involved. ID is the unique identifier of the item within an ExternalRequest.

Log Package

The log package groups the log information sent by Location Data Processing.

Log

The entity Log contains the information about the execution of an action.

Message Data Type

The CustomerRequirement included in the business document. The business information that is relevant for sending a business document in a message. The message data type CustomerRequirementExternalRequestItemChangeRequestMessage_sync, therefore, provides the structure for the message type CustomerRequirementExternalRequestItemChangeRequest_sync and the interface that is based on it. FIGS. 146-1 through 146-12 show a CustomerRequirementExternalRequestItemChangeRequestMessage_sync 146000 package. The CustomerRequirementExternalRequestItemChangeRequestMessage_sync 146000 package is a CustomerRequirementCreateRequestMessage_sync 146004 datatype. The CustomerRequirementExternalRequestItemChangeRequestMessage_sync 146000 package includes a CustomerRequirementExternalRequestItemChangeRequestMessage_sync 146002 entity. The CustomerRequirementExternalRequestItemChangeRequestMessage_sync 146000 package includes a CustomerRequirement 146006 package.

The CustomerRequirement 146006 package includes a CustomerRequirement 146008 entity. The CustomerRequirement 146006 package includes an ExternalRequest 146024 package.

The CustomerRequirement 146008 entity has a cardinality of one 146010 meaning that for each instance of the CustomerRequirementExternalRequestItemChangeRequestMessage_sync 146002 entity there is one CustomerRequirement 146008 entity. The CustomerRequirement 146008 entity includes various attributes, namely ID 146012 and SystemAdministrativeData 146018.

The ID 146012 attribute is a BusinessTransactionDocumentID 146016 datatype. The ID 146012 attribute has a cardinality of one 146014 meaning that for each instance of the CustomerRequirement 146008 entity there is one ID 146012 attribute.

The SystemAdministrativeData 146018 attribute is a SystemAdministrativeData 146022 datatype. The SystemAdministrativeData 146018 attribute has a cardinality of one 146020 meaning that for each instance of the CustomerRequirement 146008 entity there is one SystemAdministrativeData 146018 attribute.

The ExternalRequest 146024 package includes an ExternalRequest 146026 entity. The ExternalRequest 146024 package includes various packages, namely BusinessTransactionDocumentReference 146038 and Item 146052.

The ExternalRequest 146026 entity has a cardinality of one 146028 meaning that for each instance of the CustomerRequirement 146008 entity there is one ExternalRequest 146026 entity. The ExternalRequest 146026 entity includes a BaseBusinessTransactionDocumentTypeCode 146032 attribute.

The BaseBusinessTransactionDocumentTypeCode 146032 attribute is a BusinessTransactionDocumentTypeCode 146036 datatype. The BaseBusinessTransactionDocumentTypeCode 146032 attribute has a cardinality of one 146034 meaning that for each instance of the ExternalRequest 146026 entity there is one BaseBusinessTransactionDocumentTypeCode 146032 attribute.

The BusinessTransactionDocumentReference 146038 package includes a BaseBusinessTransactionDocumentReference 146040 entity.

The BaseBusinessTransactionDocumentReference 146040 entity has a cardinality of zero or one 146042 meaning that for each instance of the ExternalRequest 146026 entity there may be one BaseBusinessTransactionDocumentReference 146040 entity. The BaseBusinessTransactionDocumentReference 146040 entity includes an ID 146046 attribute.

The ID 146046 attribute is a BusinessTransactionDocumentID 146050 datatype. The ID 146046 attribute has a cardinality of one 146048 meaning that for each instance of the BaseBusinessTransactionDocumentReference 146040 entity there is one ID 146046 attribute.

The Item 146052 package includes an Item 146054 entity. The Item 146052 package includes various packages, namely ProductInformation 1460108, Party 1460140, Location 1460178, GroupInformation 1460216, Properties 1460236, DeliveryInformation 1460256, Transportation 1460294, BusinessTransactionDocumentItemReference 1460308 and ScheduleLine 1460322.

The Item 146054 entity has a cardinality of one 146056 meaning that for each instance of the ExternalRequest 146026 entity there is one Item 146054 entity. The Item 146054 entity includes various attributes, namely ProductAvailabilityRequirementConfirmationItemUUID 146060, ID 146066, SupplyPlanningAreaID 146072, BaseBusinessTransactionDocumentItemTypeCode 146078, DistributionChannelCode 146084, DivisionCode 146090, LogisticsExecutionBlockingReasonCode 146096 and CancellationReasonCode 1460102.

The ProductAvailabilityRequirementConfirmationItemUUID 146060 attribute is an UUID 146064 datatype. The ProductAvailabilityRequirementConfirmationItemUUID 146060 attribute has a cardinality of zero or one 146062 meaning that for each instance of the Item 146054 entity there may be one ProductAvailabilityRequirementConfirmationItemUUID 146060 attribute.

The ID 146066 attribute is a BusinessTransactionDocumentItemID 146070 datatype. The ID 146066 attribute has a cardinality of one 146068 meaning that for each instance of the Item 146054 entity there is one ID 146066 attribute.

The SupplyPlanningAreaID 146072 attribute is a SupplyPlanningAreaID 146076 datatype. The SupplyPlanningAreaID 146072 attribute has a cardinality of zero or one 146074 meaning that for each instance of the Item 146054 entity there may be one SupplyPlanningAreaID 146072 attribute.

The BaseBusinessTransactionDocumentItemTypeCode 146078 attribute is a BusinessTransactionDocument- ItemTypeCode 146082 datatype. The BaseBusinessTransactionDocumentItemTypeCode 146078 attribute has a cardinality of zero or one 146080 meaning that for each instance of the Item 146054 entity there may be one BaseBusinessTransactionDocumentItemTypeCode 146078 attribute.

The DistributionChannelCode 146084 attribute is a DistributionChannelCode 146088 datatype. The DistributionChannelCode 146084 attribute has a cardinality of zero or one 146086 meaning that for each instance of the Item 146054 entity there may be one DistributionChannelCode 146084 attribute.

The DivisionCode 146090 attribute is a DivisionCode 146094 datatype. The DivisionCode 146090 attribute has a cardinality of zero or one 146092 meaning that for each instance of the Item 146054 entity there may be one DivisionCode 146090 attribute.

The LogisticsExecutionBlockingReasonCode 146096 attribute is a BlockingReasonCode 1460100 datatype. The LogisticsExecutionBlockingReasonCode 146096 attribute has a cardinality of zero or one 146098 meaning that for each instance of the Item 146054 entity there may be one LogisticsExecutionBlockingReasonCode 146096 attribute.

The CancellationReasonCode 1460102 attribute is a CancellationReasonCode 1460106 datatype. The CancellationReasonCode 1460102 attribute has a cardinality of zero or one 1460104 meaning that for each instance of the Item 146054 entity there may be one CancellationReasonCode 1460102 attribute.

The ProductInformation 1460108 package includes a Product 1460110 entity.

The Product 1460110 entity has a cardinality of one 1460112 meaning that for each instance of the Item 146054 entity there is one Product 1460110 entity. The Product 1460110 entity includes various attributes, namely InternalID 1460116, SellerID 1460122, BuyerID 1460128 and IdentifiedStockID 1460134.

The InternalID 1460116 attribute is a ProductInternalID 1460120 datatype. The InternalID 1460116 attribute has a cardinality of one 1460118 meaning that for each instance of the Product 1460110 entity there is one InternalID 1460116 attribute.

The SellerID 1460122 attribute is a ProductPartyID 1460126 datatype. The SellerID 1460122 attribute has a cardinality of zero or one 1460124 meaning that for each instance of the Product 1460110 entity there may be one SellerID 1460122 attribute.

The BuyerID 1460128 attribute is a ProductPartyID 1460132 datatype. The BuyerID 1460128 attribute has a cardinality of zero or one 1460130 meaning that for each instance of the Product 1460110 entity there may be one BuyerID 1460128 attribute.

The IdentifiedStockID 1460134 attribute is an IdentifiedStockID 1460138 datatype. The IdentifiedStockID 1460134 attribute has a cardinality of zero or one 1460136 meaning that for each instance of the Product 1460110 entity there may be one IdentifiedStockID 1460134 attribute.

The Party 1460140 package includes various entities, namely BuyerParty 1460142, SellerParty 1460154 and ProductRecipientParty 1460166.

The BuyerParty 1460142 entity has a cardinality of zero or one 1460144 meaning that for each instance of the Item 146054 entity there may be one BuyerParty 1460142 entity. The BuyerParty 1460142 entity includes an ID 1460148 attribute.

The ID 1460148 attribute is a PartyID 1460152 datatype. The ID 1460148 attribute has a cardinality of one 1460150 meaning that for each instance of the BuyerParty 1460142 entity there is one ID 1460148 attribute.

The SellerParty 1460154 entity has a cardinality of zero or one 1460156 meaning that for each instance of the Item 146054 entity there may be one SellerParty 1460154 entity. The SellerParty 1460154 entity includes an ID 1460160 attribute.

The ID 1460160 attribute is a PartyID 1460164 datatype. The ID 1460160 attribute has a cardinality of one 1460162 meaning that for each instance of the SellerParty 1460154 entity there is one ID 1460160 attribute.

The ProductRecipientParty 1460166 entity has a cardinality of zero or one 1460168 meaning that for each instance of the Item 146054 entity there may be one ProductRecipientParty 1460166 entity. The ProductRecipientParty 1460166 entity includes an ID 1460172 attribute.

The ID 1460172 attribute is a PartyID 1460176 datatype. The ID 1460172 attribute has a cardinality of one 1460174 meaning that for each instance of the ProductRecipientParty 1460166 entity there is one ID 1460172 attribute.

The Location 1460178 package includes various entities, namely ShipToLocation 1460180 and ShipFromLocation 1460198.

The ShipToLocation 1460180 entity has a cardinality of zero or one 1460182 meaning that for each instance of the Item 146054 entity there may be one ShipToLocation 1460180 entity. The ShipToLocation 1460180 entity includes various attributes, namely BuyerID 1460186 and SellerID 1460192.

The BuyerID 1460186 attribute is a LocationPartyID 1460190 datatype. The BuyerID 1460186 attribute has a cardinality of zero or one 1460188 meaning that for each instance of the ShipToLocation 1460180 entity there may be one BuyerID 1460186 attribute.

The SellerID 1460192 attribute is a LocationPartyID 1460196 datatype. The SellerID 1460192 attribute has a cardinality of zero or one 1460194 meaning that for each instance of the ShipToLocation 1460180 entity there may be one SellerID 1460192 attribute.

The ShipFromLocation 1460198 entity has a cardinality of zero or one 1460200 meaning that for each instance of the Item 146054 entity there may be one ShipFromLocation 1460198 entity. The ShipFromLocation 1460198 entity includes various attributes, namely BuyerID 1460204 and SellerID 1460210.

The BuyerID 1460204 attribute is a LocationPartyID 1460208 datatype. The BuyerID 1460204 attribute has a cardinality of zero or one 1460206 meaning that for each instance of the ShipFromLocation 1460198 entity there may be one BuyerID 1460204 attribute.

The SellerID 1460210 attribute is a LocationPartyID 1460214 datatype. The SellerID 1460210 attribute has a cardinality of zero or one 1460212 meaning that for each instance of the ShipFromLocation 1460198 entity there may be one SellerID 1460210 attribute.

The GroupInformation 1460216 package includes a Group 1460218 entity.

The Group 1460218 entity has a cardinality of zero or one 1460220 meaning that for each instance of the Item 146054 entity there may be one Group 1460218 entity. The Group 1460218 entity includes various attributes, namely ID 1460224 and HierarchyRelationshipTypeCode 1460230.

The ID 1460224 attribute is a BusinessTransactionDocumentItemGroupID 1460228 datatype. The ID 1460224 attribute has a cardinality of one 1460226 meaning that for each instance of the Group 1460218 entity there is one ID 1460224 attribute.

The HierarchyRelationshipTypeCode 1460230 attribute is a BusinessTransactionDocumentItemHierarchyRelationshipTypeCode 1460234 datatype. The HierarchyRelationshipTypeCode 1460230 attribute has a cardinality of zero or one 1460232 meaning that for each instance of the Group 1460218 entity there may be one HierarchyRelationshipTypeCode 1460230 attribute.

The Properties 1460236 package includes a Property 1460238 entity.

The Property 1460238 entity has a cardinality of zero or n 1460240 meaning that for each instance of the Item 146054 entity there may be one or more Property 1460238 entities. The Property 1460238 entity includes various attributes, namely ID 1460244 and Value 1460250.

The ID 1460244 attribute is a PropertyID 1460248 datatype. The ID 1460244 attribute has a cardinality of one 1460246 meaning that for each instance of the Property 1460238 entity there is one ID 1460244 attribute.

The Value 1460250 attribute is a PropertyValue 1460254 datatype. The Value 1460250 attribute has a cardinality of one 1460252 meaning that for each instance of the Property 1460238 entity there is one Value 1460250 attribute.

The DeliveryInformation 1460256 package includes a DeliveryTerms 1460258 entity.

The DeliveryTerms 1460258 entity has a cardinality of zero or one 1460260 meaning that for each instance of the Item 146054 entity there may be one DeliveryTerms 1460258 entity. The DeliveryTerms 1460258 entity includes various attributes, namely PriorityCode 1460264, Incoterms 1460270, PartialDeliveryMaximumNumberValue 1460276, QuantityTolerance 1460282 and PartialDeliveryControlCode 1460288.

The PriorityCode 1460264 attribute is a PriorityCode 1460268 datatype. The PriorityCode 1460264 attribute has a cardinality of zero or one 1460266 meaning that for each instance of the DeliveryTerms 1460258 entity there may be one PriorityCode 1460264 attribute.

The Incoterms 1460270 attribute is an Incoterms 1460274 datatype. The Incoterms 1460270 attribute has a cardinality of zero or one 1460272 meaning that for each instance of the DeliveryTerms 1460258 entity there may be one Incoterms 1460270 attribute.

The PartialDeliveryMaximumNumberValue 1460276 attribute is a NumberValue 1460280 datatype. The PartialDeliveryMaximumNumberValue 1460276 attribute has a cardinality of zero or one 1460278 meaning that for each instance of the DeliveryTerms 1460258 entity there may be one PartialDeliveryMaximumNumberValue 1460276 attribute.

The QuantityTolerance 1460282 attribute is a QuantityTolerance 1460286 datatype. The QuantityTolerance 1460282 attribute has a cardinality of zero or one 1460284 meaning that for each instance of the DeliveryTerms 1460258 entity there may be one QuantityTolerance 1460282 attribute.

The PartialDeliveryControlCode 1460288 attribute is a PartialDeliveryControlCode 1460292 datatype. The PartialDeliveryControlCode 1460288 attribute has a cardinality of zero or one 1460290 meaning that for each instance of the DeliveryTerms 1460258 entity there may be one PartialDeliveryControlCode 1460288 attribute.

The Transportation 1460294 package includes a TransportationTerms 1460296 entity.

The TransportationTerms 1460296 entity has a cardinality of zero or one 1460298 meaning that for each instance of the Item 146054 entity there may be one TransportationTerms 1460296 entity. The TransportationTerms 1460296 entity includes a TransportServiceLevelCode 1460302 attribute.

The TransportServiceLevelCode 1460302 attribute is a TransportServiceLevelCode 1460306 datatype. The TransportServiceLevelCode 1460302 attribute has a cardinality of zero or one 1460304 meaning that for each instance of the TransportationTerms 1460296 entity there may be one TransportServiceLevelCode 1460302 attribute.

The BusinessTransactionDocumentItemReference 1460308 package includes a BaseBusinessTransactionDocumentItemReference 1460310 entity.

The BaseBusinessTransactionDocumentItemReference 1460310 entity has a cardinality of zero or one 1460312 meaning that for each instance of the Item 146054 entity there may be one BaseBusinessTransactionDocumentItemReference 1460310 entity. The BaseBusinessTransactionDocumentItemReference 1460310 entity includes a BusinessTransactionDocumentItemReference 1460316 attribute.

The BusinessTransactionDocumentItemReference 1460316 attribute is a BusinessTransactionDocumentReference 1460320 datatype. The BusinessTransactionDocumentItemReference 1460316 attribute has a cardinality of one 1460318 meaning that for each instance of the BaseBusinessTransactionDocumentItemReference 1460310 entity there is one BusinessTransactionDocumentItemReference 1460316 attribute.

The ScheduleLine 1460322 package includes a ScheduleLine 1460324 entity.

The ScheduleLine 1460324 entity has a cardinality of one or n 1460326 meaning that for each instance of the Item 146054 entity there are one or more ScheduleLine 1460324 entities. The ScheduleLine 1460324 entity includes various attributes, namely ID 1460330 and Quantity 1460336. The ScheduleLine 1460324 entity includes a TimeSegment 1460342 subordinate entity.

The ID 1460330 attribute is a BusinessTransactionDocumentItemScheduleLineID 1460334 datatype. The ID 1460330 attribute has a cardinality of one 1460332 meaning that for each instance of the ScheduleLine 1460324 entity there is one ID 1460330 attribute.

The Quantity 1460336 attribute is a Quantity 1460340 datatype. The Quantity 1460336 attribute has a cardinality of one 1460338 meaning that for each instance of the ScheduleLine 1460324 entity there is one Quantity 1460336 attribute.

The TimeSegment 1460342 entity has a cardinality of one or n 1460344 meaning that for each instance of the ScheduleLine 1460324 entity there are one or more TimeSegment 1460342 entities. The TimeSegment 1460342 entity includes various attributes, namely DateTimePeriod 1460348 and PeriodRoleCode 1460354.

The DateTimePeriod 1460348 attribute is an UPPEROPEN_GLOBAL_DateTimePeriod 1460352 datatype. The DateTimePeriod 1460348 attribute has a cardinality of one 1460350 meaning that for each instance of the TimeSegment 1460342 entity there is one DateTimePeriod 1460348 attribute.

The PeriodRoleCode 1460354 attribute is a PeriodRoleCode 1460358 datatype. The PeriodRoleCode 1460354 attribute has a cardinality of one 1460356 meaning that for each instance of the TimeSegment 1460342 entity there is one PeriodRoleCode 1460354 attribute.

CustomerRequirement Package

The CustomerRequirement package groups the entity CustomerRequirement with its packages ExternalRequest and CustomerRequirement. ExternalRequest is a requirement containing the quantities required of specific products as well as the dates at which they are required.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

ExternalRequest Package

The ExternalRequest package groups the entity ExternalRequest with its package Item. It contains all the item related data of an ExternalRequest.

ExternalRequest

ExternalRequest is the requirement that is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

Item Package

The Item package groups the entity Item with its packages. ProductInformation contains the information about the requested product Party contains the information about the parties that participate in an Item. Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved.

ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item. InternalID is the unique identifier of the product ID. SellerID (optional) is the identifier of the product assigned by the seller. BuyerID (optional) is the identifier of the product assigned by the buyer. IdentifiedStockID (optional) is the unique identifier of the product batch.

Party Package

BuyerParty

A BuyerParty is a party that buys a product of an Item. ID is the identifier of the Buyer within the CustomerRequirement.

SellerParty

A SellerParty is a party that sells a product of an Item. ID is the identifier of the Seller within the CustomerRequirement.

ProductRecipientParty

A ProductRecipientParty is a party to which a product of an Item is delivered. ID is the identifier of the ProductRecipient within the CustomerRequirement.

Location Package

ShipToLocation

A ShipToLocation is a location to which goods are shipped. BuyerID (optional) is the identification of the ShipToLocation that is specified by the product buyer. SellerID (optional) is the identification of the ShipToLocation that is specified by the product seller. One of the IDs (either BuyerID or SellerID) can be filled with value. The interface evaluates the values in sequence 'BuyerID, SellerID' and uses the first found one.

ShipFromLocation

ShipFromLocation is a location from which goods are shipped.

BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

Group is a reference to a collection of requirement items with a special business flavour, for example a delivery group or a MultiItemSingleDeliveryLocation group. The group describes how the items of the group depend on each other. ID is the identification of the item group ID. HierarchyRelationshipTypeCode (optional) is the type of relationship between the items in the item group.

Properties Package

Property

A Property is a consumer specific condition for execution of an availability check for an Item. The properties are also used in an availability check that can be optionally executed before the CustomerRequirement is stored. ID is the identification of the property. Value is the value of the property.

DeliveryInformation Package

DeliveryTerms

DeliveryTerms are the item-specific conditions and agreements that are valid for shipment or for the services and activities required for shipment. PriorityCode (optional) is the priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package

BaseBusinessTransactionDocumentItemReference

BaseBusinessTransactionDocumentItemReference is a unique reference to an item of a business document from which the ExternalRequest was derived. BusinessTransactionDocumentItemReference is the identifier of the referenced item of a business document.

ScheduleLine Package

ScheduleLine

The ScheduleLine is a schedule line for an Item. It contains information about when and how much of the product defined in the higher-level item is requested. ID is the unique identifier of the schedule line in a Item. Quantity is the requested quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Message Data Type

The message data type CustomerRequirementExternalRequestItemCancelRequestMessage_sync contains the ID of the CustomerRequirement included in the business document. The message data type CustomerRequirementExternalRequestItemCancelRequestMessage_sync, therefore, provides the structure for the message type CustomerRequirementExternalRequestItemCancelRequest_sync and the interface that is based on it. FIGS. 145-1 through 145-2 show a CustomerRequirementExternalRequestItemCancelRequestMessage_sync 145000 package. The CustomerRequirementExternalRequestItemCancelRequestMessage_sync 145000 package is a CustomerRequirementCreateRequestMessage_sync 145004 datatype. The CustomerRequirementExternalRequestItemCancelRequestMessage_sync 145000 package includes a CustomerRequirementExternalRequestItemCancelRequestMessage_sync 145002 entity. The CustomerRequirementExternalRequestItemCancelRequestMessage_sync 145000 package includes a CustomerRequirement 145006 package.

The CustomerRequirement 145006 package includes a CustomerRequirement 145008 entity. The CustomerRequirement 145006 package includes an ExternalRequest 145018 package.

The CustomerRequirement 145008 entity has a cardinality of one 145010 meaning that for each instance of the CustomerRequirementExternalRequestItemCancelRequestMessage_sync 145002 entity there is one CustomerRequirement 145008 entity. The CustomerRequirement 145008 entity includes an ID 145012 attribute.

The ID 145012 attribute is a BusinessTransactionDocumentID 145016 datatype. The ID 145012 attribute has a cardinality of one 145014 meaning that for each instance of the CustomerRequirement 145008 entity there is one ID 145012 attribute.

The ExternalRequest 145018 package includes an ExternalRequest 145020 entity. The ExternalRequest 145018 package includes an Item 145032 package.

The ExternalRequest 145020 entity has a cardinality of one 145022 meaning that for each instance of the CustomerRequirement 145008 entity there is one ExternalRequest 145020 entity. The ExternalRequest 145020 entity includes a BaseBusinessTransactionDocumentTypeCode 145026 attribute.

The BaseBusinessTransactionDocumentTypeCode 145026 attribute is a BusinessTransactionDocumentTypeCode 145030 datatype. The BaseBusinessTransactionDocumentTypeCode 145026 attribute has a cardinality of one 145028 meaning that for each instance of the ExternalRequest 145020 entity there is one BaseBusinessTransactionDocumentTypeCode 145026 attribute.

The Item 145032 package includes an Item 145034 entity.

The Item 145034 entity has a cardinality of one 145036 meaning that for each instance of the ExternalRequest 145020 entity there is one Item 145034 entity. The Item 145034 entity includes a 1 145040 attribute.

The 1 145040 attribute is a BusinessTransactionDocumentItemID 145042 datatype. The one 145040 attribute has a cardinality of one 145040 meaning that for each instance of the Item 145034 entity there is one 145040 attribute.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

ExternalRequest

ExternalRequest is the requirement that is derived from a sales order, quotation, or a service order and can be fulfilled by planning and delivery. It contains the quantities a customer has requested of certain products at certain dates. BaseBusinessTransactionDocumentTypeCode is the type of the business document from which this external request was derived and that represents this ExternalRequest.

Item

An Item is the request to provide or deliver a product at a certain date and, together with the product, it describes the transport and delivery agreements. It also describes the data that is valid for an item of the ExternalRequest to the parties involved. ID is the unique identifier of the item within an ExternalRequest.

Message Data Type

The message data type CustomerRequirementAvailabilityConfirmationItemCreateRequestMessage_sync, therefore, provides the structure for the message type CustomerRequirementAvailabilityConfirmationItemCreateRequest_sync and the interface that is based on it. FIGS. 138-1 through 138-9 show a CustomerRequirementAvailabilityConfirmationItemCreateRequestMessage_sync 138000 package. The CustomerRequirementAvailabilityConfirmationItemCreateRequestMessage_sync 138000 package is a CustomerRequirementCreateRequestMessage_sync 138004 datatype. The CustomerRequirementAvailabilityConfirmationItemCreateRequestMessage_sync 138000 package includes a CustomerRequirementAvailabilityConfirmationItemCreateRequestMessage_sync 138002 entity. The CustomerRequirementAvailabilityConfirmationItemCreateRequestMessage_sync 138000 package includes a CustomerRequirement 138006 package.

The CustomerRequirement 138006 package includes a CustomerRequirement 138008 entity. The CustomerRequirement 138006 package includes an AvailabilityConfirmation 138024 package.

The CustomerRequirement 138008 entity has a cardinality of one 138010 meaning that for each instance of the CustomerRequirementAvailabilityConfirmationItemCreateRequestMessage_sync 138002 entity there is one CustomerRequirement 138008 entity. The CustomerRequirement 138008 entity includes various attributes, namely ID 138012 and SystemAdministrativeData 138018.

The ID 138012 attribute is a BusinessTransactionDocumentID 138016 datatype. The ID 138012 attribute has a cardinality of one 138014 meaning that for each instance of the CustomerRequirement 138008 entity there is one ID 138012 attribute.

The SystemAdministrativeData 138018 attribute is a SystemAdministrativeData 138022 datatype. The SystemAdministrativeData 138018 attribute has a cardinality of one 138020 meaning that for each instance of the CustomerRequirement 138008 entity there is one SystemAdministrativeData 138018 attribute.

The AvailabilityConfirmation 138024 package includes an AvailabilityConfirmation 138026 entity. The AvailabilityConfirmation 138024 package includes various packages, namely BusinessTransactionDocumentReference 138038 and Item 138052.

The AvailabilityConfirmation 138026 entity has a cardinality of zero or one 138028 meaning that for each instance of the CustomerRequirement 138008 entity there may be one AvailabilityConfirmation 138026 entity. The AvailabilityConfirmation 138026 entity includes a BaseBusinessTransactionDocumentTypeCode 138032 attribute.

The BaseBusinessTransactionDocumentTypeCode 138032 attribute is a BusinessTransactionDocumentTypeCode 138036 datatype. The BaseBusinessTransactionDocumentTypeCode 138032 attribute has a cardinality of one 138034 meaning that for each instance of the AvailabilityConfirmation 138026 entity there is one BaseBusinessTransactionDocumentTypeCode 138032 attribute.

The BusinessTransactionDocumentReference 138038 package includes a BaseBusinessTransactionDocumentReference 138040 entity.

The BaseBusinessTransactionDocumentReference 138040 entity has a cardinality of zero or one 138042 meaning that for each instance of the AvailabilityConfirmation 138026 entity there may be one BaseBusinessTransactionDocumentReference 138040 entity. The BaseBusinessTransactionDocumentReference 138040 entity includes an ID 138046 attribute.

The ID 138046 attribute is a BusinessTransactionDocumentID 138050 datatype. The ID 138046 attribute has a cardinality of one 138048 meaning that for each instance of the BaseBusinessTransactionDocumentReference 138040 entity there is one ID 138046 attribute.

The Item 138052 package includes an Item 138054 entity. The Item 138052 package includes various packages, namely ProductInformation 138096, Location 1380128, GroupInformation 1380148, BusinessTransactionDocumentItemReference 1380168 and ScheduleLine 1380194.

The Item 138054 entity has a cardinality of one 138056 meaning that for each instance of the AvailabilityConfirmation 138026 entity there is one Item 138054 entity.

The ProductInformation 138096 package includes a Product 138098 entity.

The Product 138098 entity has a cardinality of one 1380100 meaning that for each instance of the Item 138054 entity there is one Product 138098 entity. The Product 138098 entity includes various attributes, namely InternalID 1380104, SellerID 1380110, BuyerID 1380116 and IdentifiedStockID 1380122.

The InternalID 1380104 attribute is a ProductInternalID 1380108 datatype. The InternalID 1380104 attribute has a cardinality of one 1380106 meaning that for each instance of the Product 138098 entity there is one InternalID 1380104 attribute.

The SellerID 1380110 attribute is a ProductPartyID 1380114 datatype. The SellerID 1380110 attribute has a cardinality of zero or one 1380112 meaning that for each instance of the Product 138098 entity there may be one SellerID 1380110 attribute.

The BuyerID 1380116 attribute is a ProductPartyID 1380120 datatype. The BuyerID 1380116 attribute has a cardinality of zero or one 1380118 meaning that for each instance of the Product 138098 entity there may be one BuyerID 1380116 attribute.

The IdentifiedStockID 1380122 attribute is an IdentifiedStockID 1380126 datatype. The IdentifiedStockID 1380122 attribute has a cardinality of zero or one 1380124 meaning that for each instance of the Product 138098 entity there may be one IdentifiedStockID 1380122 attribute.

The Location 1380128 package includes a ShipFromLocation 1380130 entity.

The ShipFromLocation 1380130 entity has a cardinality of one 1380132 meaning that for each instance of the Item 138054 entity there is one ShipFromLocation 1380130 entity. The ShipFromLocation 1380130 entity includes various attributes, namely BuyerID 1380136 and SellerID 1380142.

The BuyerID 1380136 attribute is a LocationPartyID 1380140 datatype. The BuyerID 1380136 attribute has a cardinality of zero or one 1380138 meaning that for each instance of the ShipFromLocation 1380130 entity there may be one BuyerID 1380136 attribute.

The SellerID 1380142 attribute is a LocationPartyID 1380146 datatype. The SellerID 1380142 attribute has a cardinality of zero or one 1380144 meaning that for each instance of the ShipFromLocation 1380130 entity there may be one SellerID 1380142 attribute.

The GroupInformation 1380148 package includes a Group 1380150 entity.

The Group 1380150 entity has a cardinality of zero or one 1380152 meaning that for each instance of the Item 138054 entity there may be one Group 1380150 entity. The Group 1380150 entity includes various attributes, namely ID 1380156 and HierarchyRelationshipTypeCode 1380162.

The ID 1380156 attribute is a BusinessTransactionDocumentItemGroupID 1380160 datatype. The ID 1380156 attribute has a cardinality of one 1380158 meaning that for each instance of the Group 1380150 entity there is one ID 1380156 attribute.

The HierarchyRelationshipTypeCode 1380162 attribute is a BusinessTransactionDocumentItemHierarchyRelationshipTypeCode 1380166 datatype. The HierarchyRelationshipTypeCode 1380162 attribute has a cardinality of zero or one 1380164 meaning that for each instance of the Group 1380150 entity there may be one HierarchyRelationshipTypeCode 1380162 attribute.

The BusinessTransactionDocumentItemReference 1380168 package includes various entities, namely BaseBusinessTransactionDocumentItemReference 1380170 and OutboundDeliveryReference 1380182.

The BaseBusinessTransactionDocumentItemReference 1380170 entity has a cardinality of zero or one 1380172 meaning that for each instance of the Item 138054 entity there may be one BaseBusinessTransactionDocumentItemReference 1380170 entity. The BaseBusinessTransactionDocumentItemReference 1380170 entity includes a BusinessTransactionDocumentItemReference 1380176 attribute.

The BusinessTransactionDocumentItemReference 1380176 attribute is a BusinessTransactionDocumentReference 1380180 datatype. The BusinessTransactionDocumentItemReference 1380176 attribute has a cardinality of one 1380178 meaning that for each instance of the BaseBusinessTransactionDocumentItemReference 1380170 entity there is one BusinessTransactionDocumentItemReference 1380176 attribute.

The OutboundDeliveryReference 1380182 entity has a cardinality of zero or one 1380184 meaning that for each instance of the Item 138054 entity there may be one OutboundDeliveryReference 1380182 entity. The OutboundDeliveryReference 1380182 entity includes a BusinessTransactionDocumentItemReference 1380188 attribute.

The BusinessTransactionDocumentItemReference 1380188 attribute is a BusinessTransactionDocumentReference 1380192 datatype. The BusinessTransactionDocumentItemReference 1380188 attribute has a cardinality of one 1380190 meaning that for each instance of the OutboundDeliveryReference 1380182 entity there is one BusinessTransactionDocumentItemReference 1380188 attribute.

The ScheduleLine 1380194 package includes a ScheduleLine 1380196 entity.

The ScheduleLine 1380196 entity has a cardinality of one or n 1380198 meaning that for each instance of the Item 138054 entity there are one or more ScheduleLine 1380196 entities. The ScheduleLine 1380196 entity includes various attributes, namely ID 1380202 and Quantity 1380208. The ScheduleLine 1380196 entity includes a TimeSegment 1380214 subordinate entity.

The ID 1380202 attribute is a BusinessTransactionDocumentItemScheduleLineID 1380206 datatype. The ID 1380202 attribute has a cardinality of one 1380204 meaning that for each instance of the ScheduleLine 1380196 entity there is one ID 1380202 attribute.

The Quantity 1380208 attribute is a Quantity 1380212 datatype. The Quantity 1380208 attribute has a cardinality of one 1380210 meaning that for each instance of the ScheduleLine 1380196 entity there is one Quantity 1380208 attribute.

The TimeSegment 1380214 entity has a cardinality of one or n 1380216 meaning that for each instance of the ScheduleLine 1380196 entity there are one or more TimeSegment 1380214 entities. The TimeSegment 1380214 entity includes various attributes, namely DateTimePeriod 1380220 and PeriodRoleCode 1380226.

The DateTimePeriod 1380220 attribute is an UPPEROPEN_GLOBAL_DateTimePeriod 1380224 datatype. The DateTimePeriod 1380220 attribute has a cardinality of one 1380222 meaning that for each instance of the TimeSegment 1380214 entity there is one DateTimePeriod 1380220 attribute.

The PeriodRoleCode 1380226 attribute is a PeriodRoleCode 1380230 datatype. The PeriodRoleCode 1380226 attribute has a cardinality of one 1380228 meaning that for each instance of the TimeSegment 1380214 entity there is one PeriodRoleCode 1380226 attribute.

CustomerRequirement Package

The CustomerRequirement package groups the entity CustomerRequirement with its package AvailabilityConfirmation is a confirmation of the available quantities of the products or suitable substitute products, the location in which they are available as well as the dates at which they are available.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

AvailabilityConfirmation Package

The AvailabilityConfirmation package groups the entity AvailabilityConfirmation with its package. Item contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

Item Package

The Item package groups the entity Item with its packages: ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business transaction document item. ScheduleLine contains the schedule lines of the Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem. ExternalRequestItemUUID is the reference to the ExternalRequestItem for which this confirmation item is valid. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package

ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentItemReference Package

BaseBusinessTransactionDocumentItemReference

BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package

ScheduleLine

The ScheduleLine is a schedule line for an item of an AvailabilityConfirmation. It describes the date and quantity in which the confirmed product is desired or expected to be provided or shipped. ID is the unique identifier of the schedule line in a Item. Quantity is the confirmed quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Message Data Type

The message data type CustomerRequirementAvailabilityConfirmationItemConfirmationMessage_sync contains the ID of the CustomerRequirement included in the business document. The message data type CustomerRequirementAvailabilityConfirmationItemConfirmationMessage_sync, therefore, provides the structure for the message types CustomerRequirementAvailabilityConfirmationItemCreateConfirmation_sync, CustomerRequirementAvailabilityConfirmationItemChange Confirmation_sync and CustomerRequirementAvailabilityConfirmationCancelItemConfirmation_sync and the interfaces that are based on it. FIGS. 137-1 through 137-2 show a CustomerRequirementAvailabilityConfirmationItemConfirmationMessage_sync 137000 package. The CustomerRequirementAvailabilityConfirmationItemConfirmationMessage_sync 137000 package is a CustomerRequirementCreateRequestMessage_sync 137004 datatype. The CustomerRequirementAvailabilityConfirmationItemConfirmationMessage_sync 137000 package includes a CustomerRequirementAvailabilityConfirmationItemConfirmationMessage_sync 137002 entity. The CustomerRequirementAvailabilityConfirmationItemConfirmationMessage_sync 137000 package includes various packages, namely CustomerRequirement 137006 and Log 137046.

The CustomerRequirement 137006 package includes a CustomerRequirement 137008 entity. The CustomerRequirement 137006 package includes an AvailabilityConfirmation 137018 package.

The CustomerRequirement 137008 entity has a cardinality of one 137010 meaning that for each instance of the CustomerRequirementAvailabilityConfirmationItemConfirmationMessage_sync 137002 entity there is one CustomerRequirement 137008 entity. The CustomerRequirement 137008 entity includes an ID 137012 attribute.

The ID 137012 attribute is a BusinessTransactionDocumentID 137016 datatype. The ID 137012 attribute has a cardinality of one 137014 meaning that for each instance of the CustomerRequirement 137008 entity there is one ID 137012 attribute.

The AvailabilityConfirmation 137018 package includes an AvailabilityConfirmation 137020 entity. The AvailabilityConfirmation 137018 package includes an Item 137032 package.

The AvailabilityConfirmation 137020 entity has a cardinality of one 137022 meaning that for each instance of the CustomerRequirement 137008 entity there is one AvailabilityConfirmation 137020 entity. The AvailabilityConfirmation 137020 entity includes a BaseBusinessTransactionDocumentTypeCode 137026 attribute.

The BaseBusinessTransactionDocumentTypeCode 137026 attribute is a BusinessTransactionDocumentTypeCode 137030 datatype. The BaseBusinessTransactionDocumentTypeCode 137026 attribute has a cardinality of one 137028 meaning that for each instance of the AvailabilityConfirmation 137020 entity there is one BaseBusinessTransactionDocumentTypeCode 137026 attribute.

The Item 137032 package includes an Item 137034 entity.

The Item 137034 entity has a cardinality of one 137036 meaning that for each instance of the AvailabilityConfirmation 137020 entity there is one Item 137034 entity. The Item 137034 entity includes an ID 137040 attribute.

The ID 137040 attribute is a BusinessTransactionDocumentItemID 137044 datatype. The ID 137040 attribute has a cardinality of one 137042 meaning that for each instance of the Item 137034 entity there is one ID 137040 attribute.

The Log 137046 package is a Log 137052 datatype. The Log 137046 package includes a Log 137048 entity.

The Log 137048 entity has a cardinality of one 137050 meaning that for each instance of the CustomerRequirementAvailabilityConfirmationItemConfirmationMessage_sync 137002 entity there is one Log 137048 entity.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

Item

An Item is the request to provide or deliver a product at a certain date and, together with the product, it describes the transport and delivery agreements. It also describes the data that is valid for an item of the ExternalRequest to the parties involved. ID is the unique identifier of the item within an ExternalRequest.

Log Package

The log package groups the log information sent by Location Data Processing.

Log

The entity Log contains the information about the execution of an action.

Message Data Type

The message data type CustomerRequirementChangeRequestMessage_sync contains the CustomerRequirement included in the business document and the business information that is relevant for sending a business document in a message. The message data type CustomerRequirementChangeRequestMessage_sync, therefore, provides the structure for the message type CustomerRequirementChangeRequest_sync and the interface that is based on it. FIGS. 136-1 through 136-9 show a CustomerRequirementAvailabilityConfirmationItemChangeRequestMessage_sync 136000 package. The CustomerRequirementAvailabilityConfirmationItemChangeRequestMessage_sync 136000 package is a CustomerRequirementCreateRequestMessage_sync 136004 datatype. The CustomerRequirementAvailabilityConfirmationItemChangeRequestMessage_sync 136000 package includes a CustomerRequirementAvailabilityConfirmationItemChangeRequestMessage_sync 136002 entity. The CustomerRequirementAvailabilityConfirmationItemChangeRequestMessage_sync 136000 package includes a CustomerRequirement 136006 package.

The CustomerRequirement 136006 package includes a CustomerRequirement 136008 entity. The CustomerRequirement 136006 package includes an AvailabilityConfirmation 136024 package.

The CustomerRequirement 136008 entity has a cardinality of one 136010 meaning that for each instance of the CustomerRequirementAvailabilityConfirmationItemChangeRequestMessage_sync 136002 entity there is one CustomerRequirement 136008 entity. The CustomerRequirement 136008 entity includes various attributes, namely ID 136012 and SystemAdministrativeData 136018.

The ID 136012 attribute is a BusinessTransactionDocumentID 136016 datatype. The ID 136012 attribute has a cardinality of one 136014 meaning that for each instance of the CustomerRequirement 136008 entity there is one ID 136012 attribute.

The SystemAdministrativeData 136018 attribute is a SystemAdministrativeData 136022 datatype. The SystemAdministrativeData 136018 attribute has a cardinality of one 136020 meaning that for each instance of the CustomerRequirement 136008 entity there is one SystemAdministrativeData 136018 attribute.

The AvailabilityConfirmation 136024 package includes an AvailabilityConfirmation 136026 entity. The AvailabilityConfirmation 136024 package includes various packages, namely BusinessTransactionDocumentReference 136038 and Item 136052.

The AvailabilityConfirmation 136026 entity has a cardinality of zero or one 136028 meaning that for each instance of the CustomerRequirement 136008 entity there may be one AvailabilityConfirmation 136026 entity. The AvailabilityConfirmation 136026 entity includes a BaseBusinessTransactionDocumentTypeCode 136032 attribute.

The BaseBusinessTransactionDocumentTypeCode 136032 attribute is a BusinessTransactionDocumentTypeCode 136036 datatype. The BaseBusinessTransactionDocumentTypeCode 136032 attribute has a cardinality of one 136034 meaning that for each instance of the AvailabilityConfirmation 136026 entity there is one BaseBusinessTransactionDocumentTypeCode 136032 attribute.

The BusinessTransactionDocumentReference 136038 package includes a BaseBusinessTransactionDocumentReference 136040 entity.

The BaseBusinessTransactionDocumentReference 136040 entity has a cardinality of zero or one 136042 meaning that for each instance of the AvailabilityConfirmation 136026 entity there may be one BaseBusinessTransactionDocumentReference 136040 entity. The BaseBusinessTransactionDocumentReference 136040 entity includes an ID 136046 attribute.

The ID 136046 attribute is a BusinessTransactionDocumentID 136050 datatype. The ID 136046 attribute has a cardinality of one 136048 meaning that for each instance of the BaseBusinessTransactionDocumentReference 136040 entity there is one ID 136046 attribute.

The Item 136052 package includes an Item 136054 entity. The Item 136052 package includes various packages, namely ProductInformation 136096, Location 1360128, GroupInformation 1360148, BusinessTransactionDocumentItemReference 1360168 and ScheduleLine 1360194.

The Item 136054 entity has a cardinality of one 136056 meaning that for each instance of the AvailabilityConfirmation 136026 entity there is one Item 136054 entity. The Item 136054 entity includes various attributes, namely ProductAvailabilityRequirementConfirmationItemUUID 136060, ID 136066, BaseBusinessTransactionDocumentItemTypeCode 136072, SystemAdministrativeData 136078, SupplyPlanningAreaID 136084 and ExternalRequestItemUUID 136090.

The ProductAvailabilityRequirementConfirmationItemUUID 136060 attribute is an UUID 136064 datatype. The ProductAvailabilityRequirementConfirmationItemUUID 136060 attribute has a cardinality of zero or one 136062 meaning that for each instance of the Item 136054 entity there may be one ProductAvailabilityRequirementConfirmationItemUUID 136060 attribute.

The ID 136066 attribute is a BusinessTransactionDocumentItemID 136070 datatype. The ID 136066 attribute has a cardinality of one 136068 meaning that for each instance of the Item 136054 entity there is one ID 136066 attribute.

The BaseBusinessTransactionDocumentItemTypeCode 136072 attribute is a BusinessTransactionDocumentItemTypeCode 136076 datatype. The BaseBusinessTransactionDocumentItemTypeCode 136072 attribute has a cardinality of zero or one 136074 meaning that for each instance of the Item 136054 entity there may be one BaseBusinessTransactionDocumentItemTypeCode 136072 attribute.

The SystemAdministrativeData 136078 attribute is a SystemAdministrativeData 136082 datatype. The SystemAdministrativeData 136078 attribute has a cardinality of one 136080 meaning that for each instance of the Item 136054 entity there is one SystemAdministrativeData 136078 attribute.

The SupplyPlanningAreaID 136084 attribute is a SupplyPlanningAreaID 136088 datatype. The SupplyPlanningAreaID 136084 attribute has a cardinality of zero or one 136086 meaning that for each instance of the Item 136054 entity there may be one SupplyPlanningAreaID 136084 attribute.

The ExternalRequestItemUUID 136090 attribute is an UUID 136094 datatype. The ExternalRequestItemUUID 136090 attribute has a cardinality of one 136092 meaning that for each instance of the Item 136054 entity there is one ExternalRequestItemUUID 136090 attribute.

The ProductInformation 136096 package includes a Product 136098 entity.

The Product 136098 entity has a cardinality of one 1360100 meaning that for each instance of the Item 136054 entity there is one Product 136098 entity. The Product 136098 entity includes various attributes, namely InternalID 1360104, SellerID 1360110, BuyerID 1360116 and IdentifiedStockID 1360122.

The InternalID 1360104 attribute is a ProductInternalID 1360108 datatype. The InternalID 1360104 attribute has a cardinality of one 1360106 meaning that for each instance of the Product 136098 entity there is one InternalID 1360104 attribute.

The SellerID 1360110 attribute is a ProductPartyID 1360114 datatype. The SellerID 1360110 attribute has a cardinality of zero or one 1360112 meaning that for each instance of the Product 136098 entity there may be one SellerID 1360110 attribute.

The BuyerID 1360116 attribute is a ProductPartyID 1360120 datatype. The BuyerID 1360116 attribute has a cardinality of zero or one 1360118 meaning that for each instance of the Product 136098 entity there may be one BuyerID 1360116 attribute.

The IdentifiedStockID 1360122 attribute is an IdentifiedStockID 1360126 datatype. The IdentifiedStockID 1360122 attribute has a cardinality of zero or one 1360124 meaning that for each instance of the Product 136098 entity there may be one IdentifiedStockID 1360122 attribute.

The Location 1360128 package includes a ShipFromLocation 1360130 entity.

The ShipFromLocation 1360130 entity has a cardinality of one 1360132 meaning that for each instance of the Item 136054 entity there is one ShipFromLocation 1360130 entity. The ShipFromLocation 1360130 entity includes various attributes, namely BuyerID 1360136 and SellerID 1360142.

The BuyerID 1360136 attribute is a LocationPartyID 1360140 datatype. The BuyerID 1360136 attribute has a cardinality of zero or one 1360138 meaning that for each instance of the ShipFromLocation 1360130 entity there may be one BuyerID 1360136 attribute.

The SellerID 1360142 attribute is a LocationPartyID 1360146 datatype. The SellerID 1360142 attribute has a cardinality of zero or one 1360144 meaning that for each instance of the ShipFromLocation 1360130 entity there may be one SellerID 1360142 attribute.

The GroupInformation 1360148 package includes a Group 1360150 entity.

The Group 1360150 entity has a cardinality of zero or one 1360152 meaning that for each instance of the Item 136054 entity there may be one Group 1360150 entity. The Group 1360150 entity includes various attributes, namely ID 1360156 and HierarchyRelationshipTypeCode 1360162.

The ID 1360156 attribute is a BusinessTransactionDocumentItemGroupID 1360160 datatype. The ID 1360156 attribute has a cardinality of one 1360158 meaning that for each instance of the Group 1360150 entity there is one ID 1360156 attribute.

The HierarchyRelationshipTypeCode 1360162 attribute is a BusinessTransactionDocumentItemHierarchyRelationshipTypeCode 1360166 datatype. The HierarchyRelationshipTypeCode 1360162 attribute has a cardinality of zero or one 1360164 meaning that for each instance of the Group 1360150 entity there may be one HierarchyRelationshipTypeCode 1360162 attribute.

The BusinessTransactionDocumentItemReference 1360168 package includes various entities, namely BaseBusinessTransactionDocumentItemReference 1360170 and OutboundDeliveryReference 1360182.

The BaseBusinessTransactionDocumentItemReference 1360170 entity has a cardinality of zero or one 1360172 meaning that for each instance of the Item 136054 entity there may be one BaseBusinessTransactionDocumentItemReference 1360170 entity. The BaseBusinessTransactionDocumentItemReference 1360170 entity includes a BusinessTransactionDocumentItemReference 1360176 attribute.

The BusinessTransactionDocumentItemReference 1360176 attribute is a BusinessTransactionDocumentReference 1360180 datatype. The BusinessTransactionDocumentItemReference 1360176 attribute has a cardinality of one 1360178 meaning that for each instance of the BaseBusinessTransactionDocumentItemReference 1360170 entity there is one BusinessTransactionDocumentItemReference 1360176 attribute.

The OutboundDeliveryReference 1360182 entity has a cardinality of zero or one 1360184 meaning that for each instance of the Item 136054 entity there may be one OutboundDeliveryReference 1360182 entity. The OutboundDeliveryReference 1360182 entity includes a BusinessTransactionDocumentItemReference 1360188 attribute.

The BusinessTransactionDocumentItemReference 1360188 attribute is a BusinessTransactionDocumentReference 1360192 datatype. The BusinessTransactionDocumentItemReference 1360188 attribute has a cardinality of one 1360190 meaning that for each instance of the OutboundDeliveryReference 1360182 entity there is one BusinessTransactionDocumentItemReference 1360188 attribute.

The ScheduleLine 1360194 package includes a ScheduleLine 1360196 entity.

The ScheduleLine 1360196 entity has a cardinality of one or n 1360198 meaning that for each instance of the Item 136054 entity there are one or more ScheduleLine 1360196 entities. The ScheduleLine 1360196 entity includes various attributes, namely ID 1360202 and Quantity 1360208. The ScheduleLine 1360196 entity includes a TimeSegment 1360214 subordinate entity.

The ID 1360202 attribute is a BusinessTransactionDocumentItemScheduleLineID 1360206 datatype. The ID 1360202 attribute has a cardinality of one 1360204 meaning that for each instance of the ScheduleLine 1360196 entity there is one ID 1360202 attribute.

The Quantity 1360208 attribute is a Quantity 1360212 datatype. The Quantity 1360208 attribute has a cardinality of one 1360210 meaning that for each instance of the ScheduleLine 1360196 entity there is one Quantity 1360208 attribute.

The TimeSegment 1360214 entity has a cardinality of one or n 1360216 meaning that for each instance of the ScheduleLine 1360196 entity there are one or more TimeSegment 1360214 entities. The TimeSegment 1360214 entity includes various attributes, namely DateTimePeriod 1360220 and PeriodRoleCode 1360226.

The DateTimePeriod 1360220 attribute is an UPPEROPEN_GLOBAL_DateTimePeriod 1360224 datatype. The DateTimePeriod 1360220 attribute has a cardinality of one 1360222 meaning that for each instance of the TimeSegment 1360214 entity there is one DateTimePeriod 1360220 attribute.

The PeriodRoleCode 1360226 attribute is a PeriodRoleCode 1360230 datatype. The PeriodRoleCode 1360226 attribute has a cardinality of one 1360228 meaning that for each instance of the TimeSegment 1360214 entity there is one PeriodRoleCode 1360226 attribute.

CustomerRequirement Package

The CustomerRequirement package groups the entity CustomerRequirement with its package AvailabilityConfirmation. The availability confirmation is a confirmation of the available quantities of the products or suitable substitute products, the location in which they are available as well as the dates at which they are available.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

AvailabilityConfirmation Package

The AvailabilityConfirmation package groups the entity AvailabilityConfirmation with its package Item. It contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

Item Package

The Item package groups the entity Item with its packages. ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business transaction document item. ScheduleLine contains the schedule lines of the Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem. ExternalRequestItemUUID is the reference to the ExternalRequestItem for which this confirmation item is valid. The UUID of a confirmation item in a product availability requirement is necessary, when an availability check (ProductAvailabilityRequirementCheckAndReserve) was executed before CustomerRequirementCreateRequest_sync Message is used. The ProductAvailabilityRequirementConfirmationItemUUID is the ID of the confirmation item that was returned by availability check.

ProductInformationPackage

Product

A Product is the identification, description, and classification of the product in the Item.

InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package

ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentReference Package

BaseBusinessTransactionDocumentItemReference

BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package

ScheduleLine

The ScheduleLine is a schedule line for an item of an AvailabilityConfirmation. It describes the date and quantity in which the confirmed product is desired or expected to be provided or shipped. ID is the unique identifier of the schedule line in an Item. Quantity is the confirmed quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Message Data Type

The message data type CustomerRequirementAvailabilityConfirmationItemCancelRequestMessage_sync contains the ID of the CustomerRequirement included in the business document. The message data type CustomerRequirementAvailabilityConfirmationItemCancelRequestMessage_sync, therefore, provides the structure for the message type CustomerRequirementAvailabilityConfirmationItemCancelRequest_sync and the interface that is based on it. FIGS. 135-1 through 135-2 show a CustomerRequirementAvailabilityConfirmationItemCancelRequestMessage_sync 135000 package. The CustomerRequirementAvailabilityConfirmationItemCancelRequestMessage_sync 135000 package is a CustomerRequirementCreateRequestMessage_sync 135004 datatype. The CustomerRequirementAvailabilityConfirmationItemCancelRequestMessage_sync 135000 package includes a CustomerRequirementAvailabilityConfirmationItemCancelRequestMessage_sync 135002 entity. The CustomerRequirementAvailabilityConfirmationItemCancelRequestMessage_sync 135000 package includes a CustomerRequirement 135006 package.

The CustomerRequirement 135006 package includes a CustomerRequirement 135008 entity. The CustomerRequirement 135006 package includes an AvailabilityConfirmation 135018 package.

The CustomerRequirement 135008 entity has a cardinality of one 135010 meaning that for each instance of the CustomerRequirementAvailabilityConfirmationItemCancelRequestMessage_sync 135002 entity there is one CustomerRequirement 135008 entity. The CustomerRequirement 135008 entity includes an ID 135012 attribute.

The ID 135012 attribute is a BusinessTransactionDocumentID 135016 datatype. The ID 135012 attribute has a cardinality of one 135014 meaning that for each instance of the CustomerRequirement 135008 entity there is one ID 135012 attribute.

The AvailabilityConfirmation 135018 package includes an AvailabilityConfirmation 135020 entity. The AvailabilityConfirmation 135018 package includes an Item 135032 package.

The AvailabilityConfirmation 135020 entity has a cardinality of one 135022 meaning that for each instance of the CustomerRequirement 135008 entity there is one AvailabilityConfirmation 135020 entity. The AvailabilityConfirmation 135020 entity includes a BaseBusinessTransactionDocumentTypeCode 135026 attribute.

The BaseBusinessTransactionDocumentTypeCode 135026 attribute is a BusinessTransactionDocumentTypeCode 135030 datatype. The BaseBusinessTransactionDocumentTypeCode 135026 attribute has a cardinality of one 135028 meaning that for each instance of the AvailabilityConfirmation 135020 entity there is one BaseBusinessTransactionDocumentTypeCode 135026 attribute.

The Item 135032 package includes an Item 135034 entity.

The Item 135034 entity has a cardinality of one 135036 meaning that for each instance of the AvailabilityConfirmation 135020 entity there is one Item 135034 entity. The Item 135034 entity includes an ID 135040 attribute.

The ID 135040 attribute is a BusinessTransactionDocumentItemID 135044 datatype. The ID 135040 attribute has a cardinality of one 135042 meaning that for each instance of the Item 135034 entity there is one ID 135040 attribute.

CustomerRequirement Package

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

Item

An Item contains the information about the confirmed product and quantity. ID is the unique identifier of the item within an AvailabilityConfirmation.

Message Data Type

The message data type CustomerRequirementAvailabilityConfirmationItemByCustomerRequirementExternalRequestItemIDQueryMessage_sync contains the ID of the CustomerRequirement and the ID of an item included in its ExternalRequest or AvailabilityConfirmation. The message data type CustomerRequirementAvailabilityConfirmationItemByCustomerRequirementExternalRequestItemIDQueryMessage_sync, therefore, provides the structure for the message type CustomerRequirementAvailabilityConfirmationItemByCustomerRequirementExternalRequestItemIDQuery_sync and the interface that is based on it. FIG. 133 shows a Customer- RequirementAvailabilityConfirmationItemByCustomerRequirementExternalRequestItemIDQueryMessage_sync 133000 package. The CustomerRequirementAvailabilityConfirmationItemByCustomerRequirementExternalRequestItemIDQueryMessage_sync 133000 package is a CustomerRequirementCreateRequestMessage_sync 133004 datatype. The CustomerRequirementAvailabilityConfirmationItemByCustomerRequirementExternalRequestItemIDQueryMessage_sync 133000 package includes a CustomerRequirementAvailabilityConfirmationItemByCustomerRequirementExternalRequestItemIDQueryMessage_sync 133002 entity. The CustomerRequirementAvailabilityConfirmationItemByCustomerRequirementExternalRequestItemIDQueryMessage_sync 133000 package includes a Selection 133006 package.

The Selection 133006 package includes a CustomerRequirementAvailabilityConfirmationItemByCustomerRequirementExternalRequestItemIDSelection 133008 entity.

The CustomerRequirementAvailabilityConfirmationItemByCustomerRequirementExternalRequestItemIDSelection 133008 entity has a cardinality of one 133010 meaning that for each instance of the CustomerRequirementAvailabilityConfirmationItemByCustomerRequirementExternalRequestItemIDQueryMessage_sync 133002 entity there is one CustomerRequirementAvailabilityConfirmationItemByCustomerRequirementExternalRequestItemIDSelection 133008 entity. The CustomerRequirementAvailabilityConfirmationItemByCustomerRequirementExternalRequestItemIDSelection 133008 entity includes various attributes, namely ID 133012 and ExternalRequestItemID 133018.

The ID 133012 attribute is a BusinessTransactionDocumentID 133016 datatype. The ID 133012 attribute has a cardinality of one 133014 meaning that for each instance of the CustomerRequirementAvailabilityConfirmationItemByCustomerRequirementExternalRequestItemIDSelection 133008 entity there is one ID 133012 attribute.

The ExternalRequestItemID 133018 attribute is a BusinessTransactionDocumentItemID 133022 datatype. The ExternalRequestItemID 133018 attribute has a cardinality of one 133020 meaning that for each instance of the CustomerRequirementAvailabilityConfirmationItemByCustomerRequirementExternalRequestItemIDSelection 133008 entity there is one ExternalRequestItemID 133018 attribute.

Selection

CustomerRequirementAvailabilityConfirmationItemByCustomerRequirementExternalRequestItemIDSelection A CustomerRequirementAvailabilityConfirmationItemByCustomerRequirementExternalRequestItemIDSelection is the ID of a CustomerRequirement and an item of its ExternalRequest. ID is the unique identifier of a CustomerRequirement. ExternalRequestItemID is the unique identifier of the item within an ExternalRequest or an AvailabilityConfirmation.

Message Data Type

The CustomerRequirement is included in the business document. The business information is relevant for sending a business document in a message. The message data type CustomerRequirementAvailabilityConfirmationItemByCustomerRequirementExternalRequestItemIDResponseMessage_sync, therefore, provides the structure for the message type CustomerRequirementAvailabilityConfirmationItemByCustomerRequirementExternalRequestItemIDResponse_sync and the interface that is based on it. FIGS. 134-1 through 134-23 show a CustomerRequirementAvailabilityConfirmationItemByCustomerRequirementExternalRequestItemIDResponseMessage_sync 134000 package. The CustomerRequirementAvailabilityConfirmationItemByCustomerRequirementExternalRequestItemIDResponseMessage_sync 134000 package is a CustomerRequirementCreateRequestMessage_sync 134004 datatype. The CustomerRequirementAvailabilityConfirmationItemByCustomerRequirementExternalRequestItemIDResponseMessage_sync 134000 package includes a CustomerRequirementAvailabilityConfirmationItemByCustomerRequirementExternalRequestItemIDResponseMessage_sync 134002 entity. The CustomerRequirementAvailabilityConfirmationItemByCustomerRequirementExternalRequestItemIDResponseMessage_sync 134000 package includes various packages, namely CustomerRequirement 134006 and Log 1340568.

The CustomerRequirement 134006 package includes a CustomerRequirement 134008 entity. The CustomerRequirement 134006 package includes various packages, namely ExternalRequest 134024 and AvailabilityConfirmation 1340360.

The CustomerRequirement 134008 entity has a cardinality of one 134010 meaning that for each instance of the CustomerRequirementAvailabilityConfirmationItemByCustomerRequirementExternalRequestItemIDResponseMessage_sync 134002 entity there is one CustomerRequirement 134008 entity. The CustomerRequirement 134008 entity includes various attributes, namely ID 134012 and SystemAdministrativeData 134018.

The ID 134012 attribute is a BusinessTransactionDocumentID 134016 datatype. The ID 134012 attribute has a cardinality of one 134014 meaning that for each instance of the CustomerRequirement 134008 entity there is one ID 134012 attribute.

The SystemAdministrativeData 134018 attribute is a SystemAdministrativeData 134022 datatype. The SystemAdministrativeData 134018 attribute has a cardinality of one 134020 meaning that for each instance of the CustomerRequirement 134008 entity there is one SystemAdministrativeData 134018 attribute.

The ExternalRequest 134024 package includes an ExternalRequest 134026 entity. The ExternalRequest 134024 package includes various packages, namely BusinessTransactionDocumentReference 134038 and Item 134052.

The ExternalRequest 134026 entity has a cardinality of one 134028 meaning that for each instance of the CustomerRequirement 134008 entity there is one ExternalRequest 134026 entity. The ExternalRequest 134026 entity includes a BaseBusinessTransactionDocumentTypeCode 134032 attribute.

The BaseBusinessTransactionDocumentTypeCode 134032 attribute is a BusinessTransactionDocumentTypeCode 134036 datatype. The BaseBusinessTransactionDocumentTypeCode 134032 attribute has a cardinality of one 134034 meaning that for each instance of the ExternalRequest 134026 entity there is one BaseBusinessTransactionDocumentTypeCode 134032 attribute.

The BusinessTransactionDocumentReference 134038 package includes a BaseBusinessTransactionDocumentReference 134040 entity.

The BaseBusinessTransactionDocumentReference 134040 entity has a cardinality of zero or one 134042 meaning that for each instance of the ExternalRequest 134026 entity there may be one BaseBusinessTransactionDocumentReference 134040 entity. The BaseBusinessTransactionDocumentReference 134040 entity includes an ID 134046 attribute.

The ID 134046 attribute is a BusinessTransactionDocumentID 134050 datatype. The ID 134046 attribute has a cardinality of one 134048 meaning that for each instance of the BaseBusinessTransactionDocumentReference 134040 entity there is one ID 134046 attribute.

The Item 134052 package includes an Item 134054 entity.

The Item 134054 entity has a cardinality of one or n 134056 meaning that for each instance of the ExternalRequest 134026 entity there are one or more Item 134054 entities. The Item 134054 entity includes various attributes, namely ProductAvailabilityRequirementConfirmationItemUUID 134060, ID 134066, SupplyPlanningAreaID 134072, BaseBusinessTransactionDocumentItemTypeCode 134078, DistributionChannelCode 134084, DivisionCode 134090, LogisticsExecutionBlockingReasonCode 134096 and CancellationReasonCode 1340102.

The ProductAvailabilityRequirementConfirmationItemUUID 134060 attribute is an UUID 134064 datatype. The ProductAvailabilityRequirementConfirmationItemUUID 134060 attribute has a cardinality of one 134062 meaning that for each instance of the Item 134054 entity there is one ProductAvailabilityRequirementConfirmationItemUUID 134060 attribute.

The ID 134066 attribute is a BusinessTransactionDocumentItemID 134070 datatype. The ID 134066 attribute has a cardinality of one 134068 meaning that for each instance of the Item 134054 entity there is one ID 134066 attribute.

The SupplyPlanningAreaID 134072 attribute is a SupplyPlanningAreaID 134076 datatype. The SupplyPlanningAreaID 134072 attribute has a cardinality of zero or one 134074 meaning that for each instance of the Item 134054 entity there may be one SupplyPlanningAreaID 134072 attribute.

The BaseBusinessTransactionDocumentItemTypeCode 134078 attribute is a BusinessTransactionDocumentItemTypeCode 134082 datatype. The BaseBusinessTransactionDocumentItemTypeCode 134078 attribute has a cardinality of zero or one 134080 meaning that for each instance of the Item 134054 entity there may be one BaseBusinessTransactionDocumentItemTypeCode 134078 attribute.

The DistributionChannelCode 134084 attribute is a DistributionChannelCode 134088 datatype. The DistributionChannelCode 134084 attribute has a cardinality of zero or one 134086 meaning that for each instance of the Item 134054 entity there may be one DistributionChannelCode 134084 attribute.

The DivisionCode 134090 attribute is a DivisionCode 134094 datatype. The DivisionCode 134090 attribute has a cardinality of zero or one 134092 meaning that for each instance of the Item 134054 entity there may be one DivisionCode 134090 attribute.

The LogisticsExecutionBlockingReasonCode 134096 attribute is a BlockingReasonCode 1340100 datatype. The LogisticsExecutionBlockingReasonCode 134096 attribute has a cardinality of zero or one 134098 meaning that for each instance of the Item 134054 entity there may be one LogisticsExecutionBlockingReasonCode 134096 attribute.

The CancellationReasonCode 1340102 attribute is a CancellationReasonCode 1340106 datatype. The CancellationReasonCode 1340102 attribute has a cardinality of zero or one 1340104 meaning that for each instance of the Item 134054 entity there may be one CancellationReasonCode 1340102 attribute.

The AvailabilityConfirmation 1340360 package includes an AvailabilityConfirmation 1340362 entity. The AvailabilityConfirmation 1340360 package includes various packages, namely BusinessTransactionDocumentReference 1340374 and Item 1340388.

The AvailabilityConfirmation 1340362 entity has a cardinality of zero or one 1340364 meaning that for each instance of the CustomerRequirement 134008 entity there may be one AvailabilityConfirmation 1340362 entity. The AvailabilityConfirmation 1340362 entity includes a BaseBusinessTransactionDocumentTypeCode 1340368 attribute.

The BaseBusinessTransactionDocumentTypeCode 1340368 attribute is a BusinessTransactionDocumentTypeCode 1340372 datatype. The BaseBusinessTransactionDocumentTypeCode 1340368 attribute has a cardinality of one 1340370 meaning that for each instance of the AvailabilityConfirmation 1340362 entity there is one BaseBusinessTransactionDocumentTypeCode 1340368 attribute.

The BusinessTransactionDocumentReference 1340374 package includes a BaseBusinessTransactionDocumentReference 1340376 entity.

The BaseBusinessTransactionDocumentReference 1340376 entity has a cardinality of zero or one 1340378 meaning that for each instance of the AvailabilityConfirmation 1340362 entity there may be one BaseBusinessTransactionDocumentReference 1340376 entity. The BaseBusinessTransactionDocumentReference 1340376 entity includes an ID 1340382 attribute.

The ID 1340382 attribute is a BusinessTransactionDocumentID 1340386 datatype. The ID 1340382 attribute has a cardinality of one 1340384 meaning that for each instance of the BaseBusinessTransactionDocumentReference 1340376 entity there is one ID 1340382 attribute.

The Item 1340388 package includes an Item 1340390 entity. The Item 1340388 package includes various packages, namely ProductInformation 1340432, Location 1340464, GroupInformation 1340484, BusinessTransactionDocumentItemReference 1340504 and ScheduleLine 1340530.

The Item 1340390 entity has a cardinality of one or n 1340392 meaning that for each instance of the AvailabilityConfirmation 1340362 entity there are one or more Item 1340390 entities. The Item 1340390 entity includes various attributes, namely ProductAvailabilityRequirementConfirmationItemUUID 1340396, ID 1340402, BaseBusinessTransactionDocumentItemTypeCode 1340408, SystemAdministrativeData 1340414, SupplyPlanningAreaID 1340420 and ExternalRequestItemUUID 1340426.

The ProductAvailabilityRequirementConfirmationItemUUID 1340396 attribute is an UUID 1340400 datatype. The ProductAvailabilityRequirementConfirmationItemUUID 1340396 attribute has a cardinality of zero or one 1340398 meaning that for each instance of the Item 1340390 entity there may be one ProductAvailabilityRequirementConfirmationItemUUID 1340396 attribute.

The ID 1340402 attribute is a BusinessTransactionDocumentItemID 1340406 datatype. The ID 1340402 attribute has a cardinality of one 1340404 meaning that for each instance of the Item 1340390 entity there is one ID 1340402 attribute.

The BaseBusinessTransactionDocumentItemTypeCode 1340408 attribute is a BusinessTransactionDocumentItemTypeCode 1340412 datatype. The BaseBusinessTransactionDocumentItemTypeCode 1340408 attribute has a cardinality of zero or one 1340410 meaning that for each instance of the Item 1340390 entity there may be one BaseBusinessTransactionDocumentItemTypeCode 1340408 attribute.

The SystemAdministrativeData 1340414 attribute is a SystemAdministrativeData 1340418 datatype. The SystemAdministrativeData 1340414 attribute has a cardinality of one 1340416 meaning that for each instance of the Item 1340390 entity there is one SystemAdministrativeData 1340414 attribute.

The SupplyPlanningAreaID 1340420 attribute is a SupplyPlanningAreaID 1340424 datatype. The SupplyPlanningAreaID 1340420 attribute has a cardinality of zero or one 1340422 meaning that for each instance of the Item 1340390 entity there may be one SupplyPlanningAreaID 1340420 attribute.

The ExternalRequestItemUUID 1340426 attribute is an UUID 1340430 datatype. The ExternalRequestItemUUID 1340426 attribute has a cardinality of one 1340428 meaning that for each instance of the Item 1340390 entity there is one ExternalRequestItemUUID 1340426 attribute.

The ProductInformation 1340432 package includes a Product 1340434 entity.

The Product 1340434 entity has a cardinality of one 1340436 meaning that for each instance of the Item 1340390 entity there is one Product 1340434 entity. The Product 1340434 entity includes various attributes, namely InternalID 1340440, SellerID 1340446, BuyerID 1340452 and IdentifiedStockID 1340458.

The InternalID 1340440 attribute is a ProductInternalID 1340444 datatype. The InternalID 1340440 attribute has a cardinality of one 1340442 meaning that for each instance of the Product 1340434 entity there is one InternalID 1340440 attribute.

The SellerID 1340446 attribute is a ProductPartyID 1340450 datatype. The SellerID 1340446 attribute has a cardinality of zero or one 1340448 meaning that for each instance of the Product 1340434 entity there may be one SellerID 1340446 attribute.

The BuyerID 1340452 attribute is a ProductPartyID 1340456 datatype. The BuyerID 1340452 attribute has a cardinality of zero or one 1340454 meaning that for each instance of the Product 1340434 entity there may be one BuyerID 1340452 attribute.

The IdentifiedStockID 1340458 attribute is an IdentifiedStockID 1340462 datatype. The IdentifiedStockID 1340458 attribute has a cardinality of zero or one 1340460 meaning that for each instance of the Product 1340434 entity there may be one IdentifiedStockID 1340458 attribute.

The Location 1340464 package includes a ShipFromLocation 1340466 entity.

The ShipFromLocation 1340466 entity has a cardinality of one 1340468 meaning that for each instance of the Item 1340390 entity there is one ShipFromLocation 1340466 entity. The ShipFromLocation 1340466 entity includes various attributes, namely BuyerID 1340472 and SellerID 1340478.

The BuyerID 1340472 attribute is a LocationPartyID 1340476 datatype. The BuyerID 1340472 attribute has a cardinality of zero or one 1340474 meaning that for each instance of the ShipFromLocation 1340466 entity there may be one BuyerID 1340472 attribute.

The SellerID 1340478 attribute is a LocationPartyID 1340482 datatype. The SellerID 1340478 attribute has a cardinality of zero or one 1340480 meaning that for each instance of the ShipFromLocation 1340466 entity there may be one SellerID 1340478 attribute.

The GroupInformation 1340484 package includes a Group 1340486 entity.

The Group 1340486 entity has a cardinality of zero or one 1340488 meaning that for each instance of the Item 1340390 entity there may be one Group 1340486 entity. The Group 1340486 entity includes various attributes, namely ID 1340492 and HierarchyRelationshipTypeCode 1340498.

The ID 1340492 attribute is a BusinessTransactionDocumentItemGroupID 1340496 datatype. The ID 1340492 attribute has a cardinality of one 1340494 meaning that for each instance of the Group 1340486 entity there is one ID 1340492 attribute.

The HierarchyRelationshipTypeCode 1340498 attribute is a BusinessTransactionDocumentItemHierarchyRelationshipTypeCode 1340502 datatype. The HierarchyRelationshipTypeCode 1340498 attribute has a cardinality of zero or one 1340500 meaning that for each instance of the Group 1340486 entity there may be one HierarchyRelationshipTypeCode 1340498 attribute.

The BusinessTransactionDocumentItemReference 1340504 package includes various entities, namely BaseBusinessTransactionDocumentItemReference 1340506 and OutboundDeliveryReference 1340518.

The BaseBusinessTransactionDocumentItemReference 1340506 entity has a cardinality of zero or one 1340508 meaning that for each instance of the Item 1340390 entity there may be one BaseBusinessTransactionDocumentItemReference 1340506 entity. The BaseBusinessTransactionDocumentItemReference 1340506 entity includes a BusinessTransactionDocumentItemReference 1340512 attribute.

The BusinessTransactionDocumentItemReference 1340512 attribute is a BusinessTransactionDocumentReference 1340516 datatype. The BusinessTransactionDocumentItemReference 1340512 attribute has a cardinality of one 1340514 meaning that for each instance of the BaseBusinessTransactionDocumentItemReference 1340506 entity there is one BusinessTransactionDocumentItemReference 1340512 attribute.

The OutboundDeliveryReference 1340518 entity has a cardinality of zero or one 1340520 meaning that for each instance of the Item 1340390 entity there may be one OutboundDeliveryReference 1340518 entity. The OutboundDeliveryReference 1340518 entity includes a BusinessTransactionDocumentItemReference 1340524 attribute.

The BusinessTransactionDocumentItemReference 1340524 attribute is a BusinessTransactionDocumentReference 1340528 datatype. The BusinessTransactionDocumentItemReference 1340524 attribute has a cardinality of one 1340526 meaning that for each instance of the OutboundDeliveryReference 1340518 entity there is one BusinessTransactionDocumentItemReference 1340524 attribute.

The ScheduleLine 1340530 package includes a ScheduleLine 1340532 entity.

The ScheduleLine 1340532 entity has a cardinality of one or n 1340534 meaning that for each instance of the Item 1340390 entity there are one or more ScheduleLine 1340532 entities. The ScheduleLine 1340532 entity includes various attributes, namely ID 1340538 and Quantity 1340544. The ScheduleLine 1340532 entity includes a TimeSegment 1340550 subordinate entity.

The ID 1340538 attribute is a BusinessTransactionDocumentItemScheduleLineID 1340542 datatype. The ID 1340538 attribute has a cardinality of one 1340540 meaning that for each instance of the ScheduleLine 1340532 entity there is one ID 1340538 attribute.

The Quantity 1340544 attribute is a Quantity 1340548 datatype. The Quantity 1340544 attribute has a cardinality of one 1340546 meaning that for each instance of the ScheduleLine 1340532 entity there is one Quantity 1340544 attribute.

The TimeSegment 1340550 entity has a cardinality of one or n 1340552 meaning that for each instance of the ScheduleLine 1340532 entity there are one or more TimeSegment 1340550 entities. The TimeSegment 1340550 entity includes various attributes, namely DateTimePeriod 1340556 and PeriodRoleCode 1340562.

The DateTimePeriod 1340556 attribute is an UPPEROPEN_GLOBAL_DateTimePeriod 1340560 datatype. The DateTimePeriod 1340556 attribute has a cardinality of one 1340558 meaning that for each instance of the TimeSegment 1340550 entity there is one DateTimePeriod 1340556 attribute.

The PeriodRoleCode 1340562 attribute is a PeriodRoleCode 1340566 datatype. The PeriodRoleCode 1340562 attribute has a cardinality of one 1340564 meaning that for each instance of the TimeSegment 1340550 entity there is one PeriodRoleCode 1340562 attribute.

The Log 1340568 package is a Log 1340574 datatype. The Log 1340568 package includes a Log 1340570 entity.

The Log 1340570 entity has a cardinality of one 1340572 meaning that for each instance of the CustomerRequirementAvailabilityConfirmation-ItemByCustomerRequirementExternalRequestItemIDResponseMessage_sync 134002 entity there is one Log 1340570 entity.

CustomerRequirement Package

The CustomerRequirement package groups the entity CustomerRequirement with its packages ExternalRequest and AvailabilityConfirmation. ExternalRequest is a requirement containing the quantities required of specific products as well as the dates at which they are required. AvailabilityConfirmation is a confirmation of the available quantities of the products or suitable substitute products, the location in which they are available as well as the dates at which they are available.

CustomerRequirement

A CustomerRequirement is a requirement that is derived from a sales order, quotation, or service order and to which details on the anticipated availability date of materials required to fulfil the requirement may be added. It contains the quantities of materials required at specific dates as well as information about which materials will be available or delivered in which quantities at which dates. ID is the unique identifier of a CustomerRequirement. SystemAdministrativeData is the administrative data that is stored in the system that describes who created or changed the customer requirement and when.

ExternalRequest Package

The ExternalRequest package groups the entity ExternalRequest with its packages BusinessTransactionDocumentReference and Item. BusinessTransactionDocumentReference contains the reference to a related business transaction document. Item contains all the item related data of an ExternalRequest.

ExternalRequest

ExternalRequest is derived from a sales order, quotation, or a service order and that can be fulfilled by planning and delivery. It contains the quantities a customer has requested of certain products at certain dates. BaseBusinessTransactionDocumentTypeCode is the type of the business document from which this external request was derived and that represents this ExternalRequest.

BusinessTransactionDocumentReference Package

BaseBusinessTransactionDocumentReference

A BaseBusinessTransactionDocumentReference is a reference to the business trans-action document from which the ExternalRequest was derived.

Item Package

The Item package groups the entity Item with its packages. ProductInformation contains the information about the requested product. Party contains the information about the parties that participate in an Item. Location contains the information about the locations that are related to Item. GroupInformation contains the information about the item group, where the Item belongs to. Properties contains the values of attributes that are related to the Item. DeliveryInformation contains the information about the item specific delivery conditions. TransportInformation contains the information about the item specific transportation conditions. BusinessTransactionDocumentReference contains the reference to a related business transaction document item. ScheduleLine contains the schedule lines of the Item.

Item

An Item is the request to provide or deliver a product at a certain date and, together with the product, it describes the transport and delivery agreements. It also describes the data that is valid for an item of the ExternalRequest to the parties involved. ProductAvailabilityRequirementConfirmationItemUUID (optional) is the universally unique identifier of a confirmation item in a product availability requirement. ID is the unique identifier of the item within an ExternalRequest. SupplyPlanningAreaID (optional) is the unique identifier of the supply planning area in which the planning for the Item. BaseBusinessTransactionDocumentItemTypeCode (optional) is the type of the item of the business document from which this Item was derived and which this Item represents. DistributionChannelCode (optional) is the coded representation of the distribution channel used to sell the product requested in this item to the customer. DivisionCode (optional) is the coded representation of the division that defines the distribution responsibility or the profit responsibility for the product requested in this item. LogisticsExecutionBlockingReasonCode (optional) is the coded representation of the logistics blocking reason. CancellationReasonCode (optional) is the coded representation of the external request item cancellation reason.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the buyer. IdentifiedStockID (optional) is the unique identifier of the product batch.

Party Package

BuyerParty

A BuyerParty is a party that buys a product of an Item. ID is the identifier of the Buyer within the CustomerRequirement.

SellerParty

A SellerParty is a party that sells a product of an Item. ID is the identifier of the Seller within the CustomerRequirement.

ProductRecipientParty

A ProductRecipientParty is a party to which a product of an Item is delivered. ID is the identifier of the ProductRecipient within the CustomerRequirement.

Location Package

ShipToLocation

A ShipToLocation is a location to which goods are shipped. BuyerID (optional) is the identification of the ShipToLocation that is specified by the product buyer. SellerID (optional) is the identification of the ShipToLocation that is specified by the product seller. One of the IDs (either BuyerID or SellerID) can be filled with value. The interface evaluates the values in sequence 'BuyerID, SellerID' and uses the first found one.

ShipFromLocation

ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

Properties Package

Property

A Property is a consumer specific condition for execution of an availability check for an Item. The properties are also used in an availability check that can be optionally executed before the CustomerRequirement is stored. ID is the identification of the property. Value is the value of the property.

DeliveryInformation Package

DeliveryTerms

DeliveryTerms are the item-specific conditions and agreements that are valid for shipment or for the services and activities required for shipment. PriorityCode (optional) is the priority/urgency of the deliveries for this item. Incoterms (optional) is the conventional contract formulations for the delivery terms. PartialDeliveryMaximumNumberValue (optional) specifies the maximum number of partial deliveries that can be made to deliver the requested quantity of an Item. QuantityTolerance (optional) is the tolerated difference between the requested and the actual delivery quantity as a percentage. PartialDeliveryControlCode (optional) is the coded representation of the delivery control. The DeliveryControlCode specifies whether a customer wishes to receive partial or single/complete deliveries.

TransportInformation Package

TransportationTerms

TransportationTerms are conditions and agreements that are valid for transportation or for the services and activities required for transportation. TransportServiceLevelCode (optional) is the coded representation of the services agreed upon concerning the speed of the delivery of the requested products.

BusinessTransactionDocumentItemReference Package

BaseBusinessTransactionDocumentItemReference is a unique reference to an item of a business document from which the ExternalRequest was derived. BusinessTransactionDocumentItemReference is the identifier of the referenced item of a business document.

ScheduleLine Package

ScheduleLine

The ScheduleLine is a schedule line for an Item. It contains information about when and how much of the product defined in the higher-level item is requested. ID is the unique identifier of the schedule line in a Item. Quantity is the requested quantity. Quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

AvailabilityConfirmation Package

The AvailabilityConfirmation package groups the entity AvailabilityConfirmation with its packages BusinessTransactionDocumentReference and Item. BusinessTransactionDocumentReference contains the reference to a related business transaction document. Item contains data related to the item of the AvailabilityConfirmation.

AvailabilityConfirmation

AvailabilityConfirmation is a confirmation of the anticipated availability of the products requested in a requirement containing information about which products are available or can be delivered in which quantities on which dates. BaseBusinessTransactionDocumentTypeCode is the type of the business document from which the AvailabilityConfirmation was derived and that represents this AvailabilityConfirmation.

BusinessTransactionDocumentReference Package

BaseBusinessTransactionDocumentReference

A BaseBusinessTransactionDocumentReference is a reference to the business trans-action document from which the AvailabilityConfirmation was derived.

Item Package

The Item package groups the entity Item with its packages. ProductInformation contains the information about the confirmed product. Party contains the information about the parties that participate in an Item. Location contains the information about the location that is related to the Item. GroupInformation contains the information about the item group, where the Item belongs to. BusinessTransactionDocumentReference contains the reference to a related business transaction document item. ScheduleLine contains the schedule lines of the Item. The Item package contains furthermore the entity Item.

Item

An Item contains the information about the confirmed product and quantity. ProductAvailabilityRequirementConfirmationItemUUID (optional) is the universally unique identifier of a confirmation item in a product availability requirement. ID is the unique identifier of the item within an AvailabilityConfirmation. BaseBusinessTransactionDocumentItemTypeCode is the type of the item of the business document from which this Item was derived and which this Item represents. SystemAdministrativeData is the administrative data that is stored in the system that describes who created or changed the Item and when. SupplyPlanningAreaID (optional) is the unique identifier of the supply planning area in which the planning for the AvailabilityConfirmationItem. ExternalRequestItemUUID is the reference to the ExternalRequestItem for which this confirmation item is valid.

ProductInformationPackage

Product

A Product is the identification, description, and classification of the product in the Item. InternalID is the unique identifier of the product. SellerID (optional) is the identifier of the product assigned by the seller. BuyerID (optional) is the identifier of the product assigned by the seller. IdentifiedStockID (optional) is the unique identifier of the product batch.

Location Package

ShipFromLocation

A ShipFromLocation is a location from which goods are shipped. BuyerID (optional) is the identification of the ShipFromLocation that is specified by the product buyer. SellerID (optional) is the identification of the ShipFromLocation that is specified by the product seller. One of the IDs (either BuyerID or SellerID) can be filled with value. The interface evaluates the values in sequence 'BuyerID, SellerID' and uses the first found one.

GroupInformation Package

Group

A Group is a reference to a collection of requirement items with a special business flavour, for example a delivery group or a MultiItemSingleDeliveryLocation group. The group describes how the items of the group depend on each other. ID is the identification of the item group. HierarchyRelationshipTypeCode (optional) is the type of relationship between the items in the item group.

BusinessTransactionDocumentReference Package

BaseBusinessTransactionDocumentItemReference

BaseBusinessTransactionDocumentItemReference is a unique reference to an item of a business document which from the Item is derived. BusinessTransactionDocumentItemReference is the identifier of the referenced item of a business document.

OutboundDeliveryItemReference

OutboundDeliveryItemReference is a unique reference to an item of an outbound delivery that is derived from the Item. BusinessTransactionDocumentItemReference is the identifier of the referenced item of an outbound delivery.

ScheduleLine Package

ScheduleLine

The ScheduleLine is a schedule line for an item of an AvailabilityConfirmation. It describes the date and quantity in which the confirmed product is desired or expected to be provided or shipped. ID is the unique identifier of the schedule line in an Item. Quantity is the confirmed quantity. An Item can contain a schedule line with material provision date as well as a schedule line with delivery date TimeSegment The TimeSegment is a time period that specifies for example the period in which the product delivery takes place or the product is available. DateTimePeriod is the time period within which the goods are to be provided or delivered to the receiver. PeriodRoleCode is the coded representation of the date type of the schedule line (material provision date or delivery date).

Log Package

The log package groups the log information sent by Location Data Processing.

Log

The entity Log contains the information about the execution of an action.

CustomerReturn-Interfaces

The CustomerReturn Interfaces provide the service operations required for the communication between a Seller and the Customer Return Processing. A Seller creates a CustomerReturn if a customer returns damaged goods, or goods that had been delivered for sale on approval.

Message Choreography

The message choreography of FIG. 149 describes a possible logical sequence of messages that can be used to realize a customer return business scenario.

A CustomerReturnCreateRequest_sync is a request to the Customer Return Processing to create a CustomerReturn. The structure of the message type CustomerReturnCreateRequest_sync is specified by the message data type CustomerReturnCreateRequestMessage_sync, which is derived from the message data type CustomerReturnMessage.

A CustomerReturnCreateConfirmation_sync is a confirmation sent from the Customer Return Processing concerning the request to create a CustomerReturn. The structure of the message type CustomerReturnCreateConfirmation_sync is specified by the message data type CustomerReturnCreateConfirmationMessage_sync, which is derived from the message data type CustomerReturnMessage.

A CustomerReturnBasicDataByBuyerAndBasicDataQuery_sync is an inquiry to the Customer Return Processing for basic data of CustomerReturns fulfilling the selection CustomerReturnBasicDataSelectionByBuyerAndBasicData. The structure of the message type CustomerReturnBasicDataByBuyerAndBasicDataQuery_sync is specified by the message data type CustomerReturnBasicDataByBuyerAndBasicDataQueryMessage_sync.

A CustomerReturnBasicDataByBuyerAndBasicDataResponse_sync is the response to the inquiry of CustomerReturnBasicDataByBuyerAndBasicDataQuery_sync. The structure of the message type CustomerReturnBasicDataByBuyerAndBasicDataResponse_sync is specified by the message data type CustomerReturnBasicDataByBuyerAndBasicDataResponseMessage_sync, which is derived from the message data type CustomerReturnMessage.

For example, a "Seller" system 149002 can request to create a customer return using the CustomerReturnCreateRequest_sync message 149006 as shown, for example, in FIG. 149. A "Customer Return Processing" system 149004 can confirm the creation request using the CustomerReturnCreateConfirmation_sync message 149008. The "Seller" system 149002 can query customer returns using the CustomerReturnBasicDataByBuyerAndBasicDataQuery_sync message 149010 as shown, for example, in FIG. 149. The "Customer Return Processing" system 149004 can respond to the query using the CustomerReturnBasicDataByBuyerAndBasicDataResponse_sync message 149012.

Message Data Type

The message data type CustomerReturnMessage contains the CustomerReturn included in the business document and the information of the message log. The message data type CustomerReturnMessage is used as an abstract maximal message data type, which unifies all packages and entities for the following concrete message data types: CustomerReturnCreateRequestMessage_sync, CustomerReturnCreateConfirmationMessage_sync, and CustomerReturnBasicDataByBuyerAndBasicDataResponseMessage_sync.

FIGS. 155-1 through 155-6 show a CustomerReturnMessage 155000 package. The CustomerReturnMessage 155000 package is a CustomerReturnMessage 155004 datatype. The CustomerReturnMessage 155000 package includes a CustomerReturnMessage 155002 entity. The CustomerReturnMessage 155000 package includes various packages, namely CustomerReturn 155022 and Log 155094A.

The CustomerReturn 155022 package includes a CustomerReturn 155024 entity. The CustomerReturn 155022 package includes various packages, namely Party 155058, SalesTerms 155022A and Item 155058A.

The CustomerReturn 155024 entity has a cardinality of zero or one 155026 meaning that for each instance of the CustomerReturnMessage 155002 entity there may be one CustomerReturn 155024 entity. The CustomerReturn 155024 entity includes various attributes, namely ID 155028, ProcessingTypeCode 155034, ProcessingTypeName 155040, BuyerID 155046 and BuyerPostingDate 155052.

The ID 155028 attribute is a CustomerReturnID 155032 datatype. The ID 155028 attribute has a cardinality of one 155030 meaning that for each instance of the CustomerReturn 155024 entity there is one ID 155028 attribute.

The ProcessingTypeCode 155034 attribute is a BusinessTransactionDocumentProcessingTypeCode 155038 datatype. The ProcessingTypeCode 155034 attribute has a cardinality of one 155036 meaning that for each instance of the CustomerReturn 155024 entity there is one ProcessingTypeCode 155034 attribute.

The ProcessingTypeName 155040 attribute is a LEN20_Name,Qualifier:ProcessingType 155044 datatype. The ProcessingTypeName 155040 attribute has a cardinality of zero or one 155042 meaning that for each instance of the CustomerReturn 155024 entity there may be one ProcessingTypeName 155040 attribute.

The BuyerID 155046 attribute is a BusinessTransactionDocumentID 155050 datatype. The BuyerID 155046 attribute has a cardinality of zero or one 155048 meaning that for each instance of the CustomerReturn 155024 entity there may be one BuyerID 155046 attribute.

The BuyerPostingDate 155052 attribute is a Date 155056 datatype. The BuyerPostingDate 155052 attribute has a cardinality of zero or one 155054 meaning that for each instance of the CustomerReturn 155024 entity there may be one BuyerPostingDate 155052 attribute.

The Party 155058 package includes various entities, namely BuyerParty 155060, SalesOrganisationParty 155074, SalesOfficeParty 155090 and SalesGroupParty 155006A.

The BuyerParty 155060 entity has a cardinality of one 155062 meaning that for each instance of the CustomerReturn 155024 entity there is one BuyerParty 155060 entity. The BuyerParty 155060 entity includes various attributes, namely Seller1ID 155064 and FormattedName 155068.

The Seller1ID 155064 attribute is a PartyPartyID 155068 datatype. The Seller1ID 155064 attribute has a cardinality of one 155066 meaning that for each instance of the BuyerParty 155060 entity there is one Seller1ID 155064 attribute.

The FormattedName 155068 attribute is a LONG_Name, Qualifier:PartyFormatted 155072 datatype. The FormattedName 155068 attribute has a cardinality of zero or one 155070 meaning that for each instance of the BuyerParty 155060 entity there may be one FormattedName 155068 attribute.

The SalesOrganisationParty 155074 entity has a cardinality of one 155076 meaning that for each instance of the CustomerReturn 155024 entity there is one SalesOrganisationParty 155074 entity. The SalesOrganisationParty 155074 entity includes various attributes, namely Seller1ID 155078 and FormattedName 155084.

The Seller1ID 155078 attribute is a PartyPartyID 155082 datatype. The Seller1ID 155078 attribute has a cardinality of one 155080 meaning that for each instance of the SalesOrganisationParty 155074 entity there is one Seller1ID 155078 attribute.

The FormattedName 155084 attribute is a LONG_Name, Qualifier:PartyFormatted 155088 datatype. The FormattedName 155084 attribute has a cardinality of zero or one 155086 meaning that for each instance of the SalesOrganisationParty 155074 entity there may be one FormattedName 155084 attribute.

The SalesOfficeParty 155090 entity has a cardinality of zero or one 155092 meaning that for each instance of the CustomerReturn 155024 entity there may be one SalesOfficeParty 155090 entity. The SalesOfficeParty 155090 entity includes various attributes, namely Seller1ID 155094 and FormattedName 155000A.

The Seller1ID 155094 attribute is a PartyInternalID 155098 datatype. The Seller1ID 155094 attribute has a cardinality of one 155096 meaning that for each instance of the SalesOfficeParty 155090 entity there is one Seller1ID 155094 attribute.

The FormattedName 155000A attribute is a LONG_Name, Qualifier:PartyFormatted 155004A datatype. The FormattedName 155000A attribute has a cardinality of zero or one 155002A meaning that for each instance of the SalesOfficeParty 155090 entity there may be one FormattedName 155000A attribute.

The SalesGroupParty 155006A entity has a cardinality of zero or one 155008A meaning that for each instance of the CustomerReturn 155024 entity there may be one SalesGroupParty 155006A entity. The SalesGroupParty 155006A entity includes various attributes, namely Seller1ID 155010A and FormattedName 155016A.

The Seller1ID 155010A attribute is a PartyInternalID 155014A datatype. The Seller1ID 155010A attribute has a cardinality of one 155012A meaning that for each instance of the SalesGroupParty 155006A entity there is one Seller1ID 155010A attribute.

The FormattedName 155016A attribute is a LONG_Name, Qualifier:PartyFormatted 155020A datatype. The FormattedName 155016A attribute has a cardinality of zero or one 155018A meaning that for each instance of the SalesGroupParty 155006A entity there may be one FormattedName 155016A attribute.

The SalesTerms 155022A package includes a SalesTerms 155024A entity.

The SalesTerms 155024A entity has a cardinality of one 155026A meaning that for each instance of the CustomerReturn 155024 entity there is one SalesTerms 155024A entity. The SalesTerms 155024A entity includes various attributes, namely DistributionChannelCode 155028A, DistributionChannelName 155034A, DivisionCode 155040A, DivisionName 155046A and ReasonCode 155052A.

The DistributionChannelCode 155028A attribute is a DistributionChannelCode 155032A datatype. The DistributionChannelCode 155028A attribute has a cardinality of one 155030A meaning that for each instance of the SalesTerms 155024A entity there is one DistributionChannelCode 155028A attribute.

The DistributionChannelName 155034A attribute is a LEN20_Name,Qualifier:DistributionChannel 155038A datatype. The DistributionChannelName 155034A attribute has a cardinality of zero or one 155036A meaning that for each instance of the SalesTerms 155024A entity there may be one DistributionChannelName 155034A attribute.

The DivisionCode 155040A attribute is a DivisionCode 155044A datatype. The DivisionCode 155040A attribute has a cardinality of zero or one 155042A meaning that for each instance of the SalesTerms 155024A entity there may be one DivisionCode 155040A attribute.

The DivisionName 155046A attribute is a LEN20_Name, Qualifier:Division 155050A datatype. The DivisionName 155046A attribute has a cardinality of zero or one 155048A meaning that for each instance of the SalesTerms 155024A entity there may be one DivisionName 155046A attribute.

The ReasonCode 155052A attribute is a CustomerTransactionDocumentReasonCode 155056A datatype. The ReasonCode 155052A attribute has a cardinality of one 155054A meaning that for each instance of the SalesTerms 155024A entity there is one ReasonCode 155052A attribute.

The Item 155058A package includes an Item 155060A entity. The Item 155058A package includes various packages, namely ProductInformation 155070A and TotalValues 155082A.

The Item 155060A entity has a cardinality of zero or n 155062A meaning that for each instance of the CustomerReturn 155024 entity there may be one or more Item 155060A entities. The Item 155060A entity includes an ID 155064A attribute.

The ID 155064A attribute is a CustomerReturnItemID 155068A datatype. The ID 155064A attribute has a cardinality of one 155066A meaning that for each instance of the Item 155060A entity there is one ID 155064A attribute.

The ProductInformation 155070A package includes a Product 155072A entity.

The Product 155072A entity has a cardinality of one 155074A meaning that for each instance of the Item 155060A entity there is one Product 155072A entity. The Product 155072A entity includes a SellertID 155076A attribute.

The SellertID 155076A attribute is a ProductPartyID 155080A datatype. The SellertID 155076A attribute has a cardinality of one 155078A meaning that for each instance of the Product 155072A entity there is one SellertID 155076A attribute.

The TotalValues 155082A package includes a TotalValues 155084A entity.

The TotalValues 155084A entity has a cardinality of one 155086A meaning that for each instance of the Item 155060A entity there is one TotalValues 155084A entity. The TotalValues 155084A entity includes a RequestedQuantity 155088A attribute.

The RequestedQuantity 155088A attribute is a Quantity 155092A datatype. The RequestedQuantity 155088A attribute has a cardinality of one 155090A meaning that for each instance of the TotalValues 155084A entity there is one RequestedQuantity 155088A attribute.

The Log 155094A package is a Log 155000B datatype. The Log 155094A package includes a Log 155096A entity.

The Log 155096A entity has a cardinality of zero or one 155098A meaning that for each instance of the CustomerReturnMessage 155002 entity there may be one Log 155096A entity.

CustomerReturn Package

The CustomerReturn package groups the CustomerReturn with its packages.

CustomerReturn

A CustomerReturn is a sales document used when a customer sends goods back. ID is the unique identifier of a CustomerReturn. ProcessingTypeCode is an encoded representation of a CustomerReturn within the Customer Return Processing. ProcessingTypeName is a name for the ProcessingTypeCode. BuyerID is a unique identifier assigned by the buyer for a CustomerReturn.

Party Package

A Party package groups together the business parties involved in the CustomerReturn.

BuyerParty

A BuyerParty is a party that purchases goods. InternalID is a proprietary identifier for a party. FormattedName is a formatted name of a party.

SalesOrganisationParty

A SalesOrganisationParty is a party that is responsible for selling goods. InternalID is a proprietary identifier for a party. FormattedName is a formatted name of a party.

SalesOfficeParty

A SalesOfficeParty is a party that is responsible for selling goods within a given geographical area. InternalID is a proprietary identifier for a party. FormattedName is a formatted name of a party.

SalesGroupParty

A SalesGroupParty is a party that identifies a group of sales people responsible for processing sales of certain products. InternalID is a proprietary identifier for a party. FormattedName is a formatted name of a party.

SalesTerms Package

A SalesTerms package groups the sales terms of a CustomerReturn.

SalesTerms

SalesTerms are agreements and conditions that apply for selling goods in the CustomerReturn. DistributionChannelCode is an encoded representation of a distribution channel via which the goods or services are made available to the customer. DistributionChannelName is a name of a DistributionChannel. DivisionCode is an encoded representation of a division that defines the responsibility for sales or profit for saleable materials or services. DivisionName is a name of a Division. ReasonCode is the coded representation of the reason for creating a CustomerReturn.

DateTerms Package

A DateTerms package groups the date terms of a CustomerReturn.

DateTerms

DateTerms are agreements regarding dates and durations for goods return that can occur in a CustomerReturn document. RequestDate is a time point at which a product is requested to be returned.

TotalValues Package

A Total Values package groups the cumulated total values of a CustomerReturn.

TotalValues

TotalValues are the cumulated total values that occur in a CustomerReturn, for example, the total gross and net weight, volume, gross and net amount, tax amount, and freight costs.

NetAmount is the total net amount of the CustomerReturn.

Item Package

The Item package groups the CustomerReturnItem with its packages:

Item

An Item is the item in a CustomerReturn that focuses on the return of goods, the prices and the preparatory steps for invoicing. Item is the identifying and administrative item information in a CustomerReturn which contains all the data that applies to the item. ID is the unique identifier for an item in the CustomerReturn.

ProductInformation Package

A ProductInformation package groups the product information of a CustomerReturnItem.

Product

Product is the identification, description and classification of the product in a CustomerReturnItem. SellerID is an identifier for a product assigned by the seller.

TotalValues Package

A TotalValues package groups the total values information of a CustomerReturnItem.

TotalValues

TotalValues are the total values of an item that result from dependent nodes of the item.

RequestedQuantity is a quantity that is requested for an item in a CustomerReturn.

Log-Package

A Log package groups the messages used for user interaction.

Log

A log is a sequence of messages that result when an application executes a task.

Message Data Type

The message data type CustomerReturnBasicDataByBuyerAndBasicDataQueryMessage_sync contains the selection included in the business document.

FIGS. 151-1 through 151-3 show a CustomerReturnBasicDataByBuyerAndBasicDataQueryMessage_sync 151000 package. The CustomerReturnBasicDataByBuyerAndBasicDataQueryMessage_sync 151000 package is a CustomerReturnBasicDataByBuyerAndBasicDataQueryMessage_sync 151004 datatype. The CustomerReturnBasicDataByBuyerAndBasicDataQueryMessage_sync 151000 package includes a CustomerReturnBasicDataByBuyerAndBasicDataQueryMessage_sync 151002 entity. The CustomerReturnBasicDataByBuyerAndBasicDataQueryMessage_sync 151000 package includes a Selection 151024 package.

The Selection 151024 package includes a CustomerReturnBasicDataSelectionByBuyerAndBasicData 151026 entity.

The CustomerReturnBasicDataSelectionByBuyerAndBasicData 151026 entity has a cardinality of one 151028 meaning that for each instance of the CustomerReturnBasicDataByBuyerAndBasicDataQueryMessage_sync 151002 entity there is one CustomerReturnBasicDataSelectionByBuyerAndBasicData 151026 entity. The CustomerReturnBasicDataSelectionByBuyerAndBasicData 151026 entity includes various attributes, namely CustomerReturnBuyerPartyInternalID 151030, CustomerReturnSalesOrganisationPartyInternalID 151036, CustomerReturnSalesOfficePartyInternalID 151042, CustomerReturnSalesGroupPartyInternalID 151048, CustomerReturnProcessingTypeCode 151054, CustomerReturnSalesTermsDistributionChannelCode 151060 and CustomerReturnSalesTermsDivisionCode 151066.

The CustomerReturnBuyerPartyInternalID 151030 attribute is a PartyInternalID 151034 datatype. The CustomerReturnBuyerPartyInternalID 151030 attribute has a cardinality of one 151032 meaning that for each instance of the CustomerReturnBasicDataSelectionByBuyerAndBasicData 151026 entity there is one CustomerReturnBuyerPartyInternalID 151030 attribute.

The CustomerReturnSalesOrganisationPartyInternalID 151036 attribute is a PartyInternalID 151040 datatype. The CustomerReturnSalesOrganisationPartyInternalID 151036 attribute has a cardinality of zero or one 151038 meaning that for each instance of the CustomerReturnBasicDataSelectionByBuyerAndBasicData 151026 entity there may be one CustomerReturnSalesOrganisationPartyInternalID 151036 attribute.

The CustomerReturnSalesOfficePartyInternalID 151042 attribute is a PartyInternalID 151046 datatype. The CustomerReturnSalesOfficePartyInternalID 151042 attribute has a cardinality of zero or one 151044 meaning that for each instance of the CustomerReturnBasicDataSelectionByBuyerAndBasicData 151026 entity there may be one CustomerReturnSalesOfficePartyInternalID 151042 attribute.

The CustomerReturnSalesGroupPartyInternalID 151048 attribute is a PartyInternalID 151052 datatype. The CustomerReturnSalesGroupPartyInternalID 151048 attribute has a cardinality of zero or one 151050 meaning that for each instance of the CustomerReturnBasicDataSelectionByBuyerAndBasicData 151026 entity there may be one CustomerReturnSalesGroupPartyInternalID 151048 attribute.

The CustomerReturnProcessingTypeCode 151054 attribute is a BusinessTransactionDocumentProcessingTypeCode 151058 datatype. The CustomerReturnProcessingTypeCode 151054 attribute has a cardinality of zero or one 151056 meaning that for each instance of the CustomerReturnBasicDataSelectionByBuyerAndBasicData 151026 entity there may be one CustomerReturnProcessingTypeCode 151054 attribute.

The CustomerReturnSalesTermsDistributionChannelCode 151060 attribute is a DistributionChannelCode 151064 datatype. The CustomerReturnSalesTermsDistributionChannelCode 151060 attribute has a cardinality of zero or one 151062 meaning that for each instance of the CustomerReturnBasicDataSelectionByBuyerAndBasicData 151026 entity there may be one CustomerReturnSalesTermsDistributionChannelCode 151060 attribute.

The CustomerReturnSalesTermsDivisionCode 151066 attribute is a DivisionCode 151070 datatype. The CustomerReturnSalesTermsDivisionCode 151066 attribute has a cardinality of zero or one 151068 meaning that for each instance of the CustomerReturnBasicDataSelectionByBuyerAndBasicData 151026 entity there may be one CustomerReturnSalesTermsDivisionCode 151066 attribute.

Selection Package

The selection package contains the attributes of CustomerReturn.

CustomerReturnBasicDataSelectionByBuyerAndBasicData

CustomerReturnBasicDataSelectionByBuyerAndBasicData specifies the criteria to select CustomerReturns by Buyer and BasicData attributes. CustomerReturnBuyerPartyInternalID is a proprietary identifier for a party. CustomerReturnSalesOrganisationPartyInternalID is an identifier that is assigned by the SellerParty for the SalesOrganisationParty. CustomerReturnSalesOfficePartyInternalID is a proprietary identifier for a party. CustomerReturnSalesGroupPartyInternalID is a proprietary identifier for a party. CustomerReturnProcessingTypeCode is a coded representation of a CustomerReturn within the Customer Return Processing. CustomerReturnSalesTermsDistributionChannelCode is a coded representation of a distribution channel via which the goods or services are made available to the customer. CustomerReturnSalesTermsDivisionCode is a coded representation of a division that defines the responsibility for sales or profit for saleable materials or services.

Message Data Type

FIGS. 154-1 through 154-3 show a CustomerReturnCreateRequestMessage_sync 154000 package. The CustomerReturnCreateRequestMessage_sync 154000 package is a CustomerReturnCreateRequestMessage_sync 154004 datatype. The CustomerReturnCreateRequestMessage_sync 154000 package includes a CustomerReturnCreateRequestMessage_sync 154002 entity. The CustomerReturnCreateRequestMessage_sync 154000 package includes a CustomerReturn 154006 package.

The CustomerReturn 154006 package includes a CustomerReturn 154008 entity. The CustomerReturn 154006 package includes various packages, namely Party 154024, SalesTerms 154046 and Item 154070.

The CustomerReturn 154008 entity has a cardinality of one 154010 meaning that for each instance of the CustomerReturnCreateRequestMessage_sync 154002 entity there is one CustomerReturn 154008 entity. The CustomerReturn 154008 entity includes various attributes, namely ProcessingTypeCode 154012 and BuyerID 154018.

The ProcessingTypeCode 154012 attribute is a BusinessTransactionDocumentProcessingTypeCode 154016 datatype. The ProcessingTypeCode 154012 attribute has a cardinality of one 154014 meaning that for each instance of the CustomerReturn 154008 entity there is one ProcessingTypeCode 154012 attribute.

The BuyerID 154018 attribute is a BusinessTransactionDocumentID 154022 datatype. The BuyerID 154018 attribute has a cardinality of zero or one 154020 meaning that for each instance of the CustomerReturn 154008 entity there may be one BuyerID 154018 attribute.

The Party 154024 package includes various entities, namely BuyerParty 154026 and SalesOrganisationParty 154036.

The BuyerParty 154026 entity has a cardinality of one 154028 meaning that for each instance of the CustomerReturn 154008 entity there is one BuyerParty 154026 entity. The BuyerParty 154026 entity includes an InternalID 154030 attribute.

The InternalID 154030 attribute is a PartyInternalID 154034 datatype. The InternalID 154030 attribute has a cardinality of one 154032 meaning that for each instance of the BuyerParty 154026 entity there is one InternalID 154030 attribute.

The SalesOrganisationParty 154036 entity has a cardinality of one 154038 meaning that for each instance of the CustomerReturn 154008 entity there is one SalesOrganisationParty 154036 entity. The SalesOrganisationParty 154036 entity includes an InternalID 154040 attribute.

The InternalID 154040 attribute is a PartyInternalID 154044 datatype. The InternalID 154040 attribute has a cardinality of one 154042 meaning that for each instance of the SalesOrganisationParty 154036 entity there is one InternalID 154040 attribute.

The SalesTerms 154046 package includes a SalesTerms 154048 entity.

The SalesTerms 154048 entity has a cardinality of one 154050 meaning that for each instance of the CustomerReturn 154008 entity there is one SalesTerms 154048 entity. The SalesTerms 154048 entity includes various attributes, namely DistributionChannelCode 154052, DivisionCode 154058 and ReasonCode 154064.

The DistributionChannelCode 154052 attribute is a DistributionChannelCode 154056 datatype. The DistributionChannelCode 154052 attribute has a cardinality of one 154054 meaning that for each instance of the SalesTerms 154048 entity there is one DistributionChannelCode 154052 attribute.

The DivisionCode 154058 attribute is a DivisionCode 154062 datatype. The DivisionCode 154058 attribute has a cardinality of one 154060 meaning that for each instance of the SalesTerms 154048 entity there is one DivisionCode 154058 attribute.

The ReasonCode 154064 attribute is a CustomerTransactionDocumentReasonCode 154068 datatype. The ReasonCode 154064 attribute has a cardinality of one 154066 meaning that for each instance of the SalesTerms 154048 entity there is one ReasonCode 154064 attribute.

The Item 154070 package includes an Item 154072 entity. The Item 154070 package includes various packages, namely ProductInformation 154076 and TotalValues 154088.

The Item 154072 entity has a cardinality of zero or n 154074 meaning that for each instance of the CustomerReturn 154008 entity there may be one or more Item 154072 entities.

The ProductInformation 154076 package includes a Product 154078 entity.

The Product 154078 entity has a cardinality of one 154080 meaning that for each instance of the Item 154072 entity there is one Product 154078 entity. The Product 154078 entity includes a SellerID 154082 attribute.

The SellerID 154082 attribute is a ProductPartyID 154086 datatype. The SellerID 154082 attribute has a cardinality of one 154084 meaning that for each instance of the Product 154078 entity there is one SellerID 154082 attribute.

The TotalValues 154088 package includes a TotalValues 154090 entity.

The TotalValues 154090 entity has a cardinality of one 154092 meaning that for each instance of the Item 154072 entity there is one TotalValues 154090 entity. The TotalValues 154090 entity includes a RequestedQuantity 154094 attribute.

The RequestedQuantity 154094 attribute is a Quantity 154098 datatype. The RequestedQuantity 154094 attribute has a cardinality of one 154096 meaning that for each instance of the TotalValues 154090 entity there is one RequestedQuantity 154094 attribute.

Message Data Type

FIG. 153 shows a CustomerReturnCreateConfirmationMessage_sync 153000 package. The CustomerReturnCreateConfirmationMessage_sync 153000 package is a CustomerReturnCreateConfirmationMessage_sync 153004 datatype. The CustomerReturnCreateConfirmationMessage_sync 153000 package includes a CustomerReturnCreateConfirmationMessage_sync 153002 entity. The CustomerReturnCreateConfirmationMessage_sync 153000 package includes various packages, namely CustomerReturn 153006 and Log 153018.

The CustomerReturn 153006 package includes a CustomerReturn 153008 entity.

The CustomerReturn 153008 entity has a cardinality of zero or one 153010 meaning that for each instance of the CustomerReturnCreateConfirmationMessage_sync 153002 entity there may be one CustomerReturn 153008 entity. The CustomerReturn 153008 entity includes an ID 153012 attribute.

The ID 153012 attribute is a CustomerReturnID 153016 datatype. The ID 153012 attribute has a cardinality of one 153014 meaning that for each instance of the CustomerReturn 153008 entity there is one ID 153012 attribute.

The Log 153018 package is a Log 153024 datatype. The Log 153018 package includes a Log 153020 entity.

The Log 153020 entity has a cardinality of one 153022 meaning that for each instance of the CustomerReturnCreateConfirmationMessage_sync 153002 entity there is one Log 153020 entity.

Message Data Type

FIGS. 152-1 through 152-5 show a CustomerReturnBasicDataByBuyerAndBasicDataResponseMessage_sync 152000 package. The CustomerReturnBasicDataByBuyerAndBasicDataResponseMessage_sync 152000 package is a CustomerReturnBasicDataByBuyerAndBasicDataResponseMessage_sync 152004 datatype. The CustomerReturnBasicDataByBuyerAndBasicDataResponseMessage_sync 152000 package includes a CustomerReturnBasicDataByBuyerAndBasicDataResponseMessage_sync 152002 entity. The CustomerReturnBasicDataByBuyerAndBasicDataResponseMessage_sync 152000 package includes various packages, namely CustomerReturn 152020 and Log 152070A.

The CustomerReturn 152020 package includes a CustomerReturn 152022 entity. The CustomerReturn 152020 package includes various packages, namely Party 152050, SalesTerms 152016A, DateTerms 152046A and TotalValues 152058A.

The CustomerReturn 152022 entity has a cardinality of zero or n 152024 meaning that for each instance of the CustomerReturnBasicDataByBuyerAndBasicDataResponseMessage_sync 152002 entity there may be one or more CustomerReturn 152022 entities. The CustomerReturn 152022 entity includes various attributes, namely ID 152026, ProcessingTypeCode 152032, ProcessingTypeName 152038 and BuyerID 152044.

The ID 152026 attribute is a CustomerReturnID 152030 datatype. The ID 152026 attribute has a cardinality of one 152028 meaning that for each instance of the CustomerReturn 152022 entity there is one ID 152026 attribute.

The ProcessingTypeCode 152032 attribute is a BusinessTransactionDocumentProcessingTypeCode 152036 datatype. The ProcessingTypeCode 152032 attribute has a cardinality of zero or one 152034 meaning that for each instance of the CustomerReturn 152022 entity there may be one ProcessingTypeCode 152032 attribute.

The ProcessingTypeName 152038 attribute is a LEN20_Name,Qualifier:ProcessingType 152042 datatype. The ProcessingTypeName 152038 attribute has a cardinality of zero or one 152040 meaning that for each instance of the CustomerReturn 152022 entity there may be one ProcessingTypeName 152038 attribute.

The BuyerID 152044 attribute is a BusinessTransactionDocumentID 152048 datatype. The BuyerID 152044 attribute has a cardinality of zero or one 152046 meaning that for each instance of the CustomerReturn 152022 entity there may be one BuyerID 152044 attribute.

The Party 152050 package includes various entities, namely BuyerParty 152052, SalesOrganisationParty 152068, SalesOfficeParty 152084 and SalesGroupParty 152000A.

The BuyerParty 152052 entity has a cardinality of one 152054 meaning that for each instance of the CustomerReturn 152022 entity there is one BuyerParty 152052 entity. The BuyerParty 152052 entity includes various attributes, namely InternalID 152056 and FormattedName 152062.

The InternalID 152056 attribute is a PartyInternalID 152060 datatype. The InternalID 152056 attribute has a cardinality of one 152058 meaning that for each instance of the BuyerParty 152052 entity there is one InternalID 152056 attribute.

The FormattedName 152062 attribute is a LONG_Name, Qualifier:PartyFormatted 152066 datatype. The FormattedName 152062 attribute has a cardinality of zero or one 152064 meaning that for each instance of the BuyerParty 152052 entity there may be one FormattedName 152062 attribute.

The SalesOrganisationParty 152068 entity has a cardinality of one 152070 meaning that for each instance of the CustomerReturn 152022 entity there is one SalesOrganisationParty 152068 entity. The SalesOrganisationParty 152068 entity includes various attributes, namely InternalID 152072 and FormattedName 152078.

The InternalID 152072 attribute is a PartyInternalID 152076 datatype. The InternalID 152072 attribute has a cardinality of one 152074 meaning that for each instance of the SalesOrganisationParty 152068 entity there is one InternalID 152072 attribute.

The FormattedName 152078 attribute is a LONG_Name, Qualifier:PartyFormatted 152082 datatype. The FormattedName 152078 attribute has a cardinality of zero or one 152080 meaning that for each instance of the SalesOrganisationParty 152068 entity there may be one FormattedName 152078 attribute.

The SalesOfficeParty 152084 entity has a cardinality of zero or one 152086 meaning that for each instance of the CustomerReturn 152022 entity there may be one SalesOfficeParty 152084 entity. The SalesOfficeParty 152084 entity includes various attributes, namely InternalID 152088 and FormattedName 152094.

The InternalID 152088 attribute is a PartyInternalID 152092 datatype. The InternalID 152088 attribute has a cardinality of one 152090 meaning that for each instance of the SalesOfficeParty 152084 entity there is one InternalID 152088 attribute.

The FormattedName 152094 attribute is a LONG_Name, Qualifier:PartyFormatted 152098 datatype. The FormattedName 152094 attribute has a cardinality of zero or one 152096 meaning that for each instance of the SalesOfficeParty 152084 entity there may be one FormattedName 152094 attribute.

The SalesGroupParty 152000A entity has a cardinality of zero or one 152002A meaning that for each instance of the CustomerReturn 152022 entity there may be one SalesGroupParty 152000A entity. The SalesGroupParty 152000A entity includes various attributes, namely InternalID 152004A and FormattedName 152010A.

The InternalID 152004A attribute is a PartyInternalID 152008A datatype. The InternalID 152004A attribute has a cardinality of one 152006A meaning that for each instance of the SalesGroupParty 152000A entity there is one InternalID 152004A attribute.

The FormattedName 152010A attribute is a LONG_Name, Qualifier:PartyFormatted 152014A datatype. The FormattedName 152010A attribute has a cardinality of zero or one 152012A meaning that for each instance of the SalesGroupParty 152000A entity there may be one FormattedName 152010A attribute.

The SalesTerms 152016A package includes a SalesTerms 152018A entity.

The SalesTerms 152018A entity has a cardinality of zero or one 152020A meaning that for each instance of the CustomerReturn 152022 entity there may be one SalesTerms 152018A entity. The SalesTerms 152018A entity includes various attributes, namely DistributionChannelCode 152022A, DistributionChannelName 152028A, DivisionCode 152034A and DivisionName 152040A.

The DistributionChannelCode 152022A attribute is a DistributionChannelCode 152026A datatype. The DistributionChannelCode 152022A attribute has a cardinality of zero or one 152024A meaning that for each instance of the SalesTerms 152018A entity there may be one DistributionChannelCode 152022A attribute.

The DistributionChannelName 152028A attribute is a LEN20_Name,Qualifier:DistributionChannel 152032A datatype. The DistributionChannelName 152028A attribute has a cardinality of zero or one 152030A meaning that for each instance of the SalesTerms 152018A entity there may be one DistributionChannelName 152028A attribute.

The DivisionCode 152034A attribute is a DivisionCode 152038A datatype. The DivisionCode 152034A attribute has a cardinality of zero or one 152036A meaning that for each instance of the SalesTerms 152018A entity there may be one DivisionCode 152034A attribute.

The DivisionName 152040A attribute is a LEN20_Name, Qualifier:Division 152044A datatype. The DivisionName 152040A attribute has a cardinality of zero or one 152042A meaning that for each instance of the SalesTerms 152018A entity there may be one DivisionName 152040A attribute.

The DateTerms 152046A package includes a DateTerms 152048A entity.

The DateTerms 152048A entity has a cardinality of zero or one 152050A meaning that for each instance of the CustomerReturn 152022 entity there may be one DateTerms 152048A entity. The DateTerms 152048A entity includes a RequestDate 152052A attribute.

The RequestDate 152052A attribute is a Date 152056A datatype. The RequestDate 152052A attribute has a cardinality of zero or one 152054A meaning that for each instance of the DateTerms 152048A entity there may be one RequestDate 152052A attribute.

The TotalValues 152058A package includes a TotalValues 152060A entity.

The TotalValues 152060A entity has a cardinality of zero or one 152062A meaning that for each instance of the CustomerReturn 152022 entity there may be one TotalValues 152060A entity. The TotalValues 152060A entity includes a NetAmount 152064A attribute.

The NetAmount 152064A attribute is an Amount 152068A datatype. The NetAmount 152064A attribute has a cardinality of zero or one 152066A meaning that for each instance of the TotalValues 152060A entity there may be one NetAmount 152064A attribute.

The Log 152070A package is a Log 152076A datatype. The Log 152070A package includes a Log 152072A entity.

The Log 152072A entity has a cardinality of one 152074A meaning that for each instance of the CustomerReturnBasicDataByBuyerAndBasicDataResponseMessage_sync 152002 entity there is one Log 152072A entity.

EquipmentResource Interfaces

Master Data Maintaining Staff needs an easy and error-free mechanism to create and/or change the planning relevant data of an Equipment Resource. This is required since whenever data is transferred from OLTP system to the Planning system, Master Data needs to be adjusted for the planning process.

Message Choreography

The message choreography of FIG. 156 describes a possible logical sequence of messages that can be used to realize an equipment resource business scenario.

An EquipmentResourceCreateRequest_sync is a request to Resource Data Processing to create an EquipmentResource. The structure of the message type EquipmentResourceCreateRequest_sync is specified by the message data type EquipmentResourceCreateRequestMessage_sync.

An EquipmentResourceCreateConfirmation_sync is a confirmation to EquipmentResourceCreateRequestMessage_sync. The structure of the message type EquipmentResourceCreateConfirmation_sync is specified by the message data type EquipmentResourceCreateConfirmationMessage_sync.

An EquipmentResourceChangeRequest_sync is a request to Resource Data Processing to change an EquipmentResource. The structure of the message type EquipmentResourceChangeRequest_sync is specified by the message data type EquipmentResourceChangeRequestMessage_sync.

An EquipmentResourceChangeConfirmation_sync is a confirmation to EquipmentResourceChangeRequest_sync. The structure of the message type EquipmentResourceChangeConfirmation_sync is specified by the message data type EquipmentResourceChangeConfirmationMessage_sync.

An EquipmentResourceDeactivateRequest_sync is a request to Resource Data Processing to deactivate an EquipmentResource. The structure of the message type EquipmentResourceDeactivateRequest_sync is specified by the message data type EquipmentResourceDeactivateRequestMessage_sync.

An EquipmentResourceDeactivateConfirmation_sync is a confirmation to EquipmentResourceDeactivateRequest_sync. The structure of the message type EquipmentResourceDeactivateConfirmation_sync is specified by the message data type EquipmentResourceDeactivateConfirmationMessage_sync.

An EquipmentResourceSimpleByLocationQuery_sync is an inquiry to Resource Data Processing for EquipmentResource basic information that satisfies the selection criteria specified in the query. The structure of the message type EquipmentResourceSimpleByBasicDataQuery_sync is specified by the message data type EquipmentResourceSimpleByBasicDataQueryMessage_sync.

An EquipmentResourceSimpleByLocationResponse_sync is the response to EquipmentResourceSimpleByLocationQuery_sync. The structure of the message type EquipmentResourceSimpleByLocationResponse_sync is specified by the message data type EquipmentResourceByLocationResponseMessage_sync.

An EquipmentResourceByIDQuery_sync is an inquiry to Resource Data Processing for EquipmentResource. The structure of the message type EquipmentResourceByIDQuery_sync is specified by the message data type EquipmentResourceByIDQueryMessage_sync.

An EquipmentResourceByIDResponse_sync is the response to EquipmentResourceByIDQuery_sync. The structure of the message type EquipmentResourceByIDResponse_sync is specified by the message data type EquipmentResourceByIDResponseMessage_sync.

For example, a "Consumer" system 156002 can request to create an equipment resource using the EquipmentResourceCreateRequest_sync message 156008 as shown, for example, in FIG. 162. A "Resource Data Processing" system 156004 can confirm the request using the EquipmentResourceCreateConfirmation_sync message 156006 as shown, for example, in FIG. 161. The "Consumer" system 156002 can request to query an equipment resource by location using the EquipmentResourceSimpleByLocationQuery_sync message 156012 as shown, for example, in FIG. 165. The "Resource Data Processing" system 156004 can respond to the request using the EquipmentResourceSimpleByLocationResponse_sync message 156010 as shown, for example, in FIG. 166. The "Consumer" system 156002 can request to query an equipment resource by ID using the EquipmentResourceByIDQuery_sync message 156016 as shown, for example, in FIG. 157. The "Resource Data Processing" system 156004 can respond to the request using the EquipmentResourceByIDResponse_sync message 156014 as shown, for example, in FIG. 158. The "Consumer" system 156002 can request to change an equipment resource using the EquipmentResourceChangeRequest_sync message 156020 as shown, for example, in FIG. 160. The "Resource Data Processing" system 156004 can confirm the request using the EquipmentResourceChangeConfirmation_sync message 156018 as shown, for example, in FIG. 159. The "Consumer" system 156002 can request to deactivate an equipment resource using the EquipmentResourceDeactivateRequest_sync message 156024 as shown, for example, in FIG. 164. The "Resource Data Processing" system 156004 can confirm the request using the EquipmentResourceDeactivateConfirmation_sync message 156022 as shown, for example, in FIG. 163.

The message data type EquipmentResourceCreateRequestMessage_sync contains the EquipmentResourceCreateRequest included in the business document and the business information that is relevant for sending a business document in a message.

FIGS. 172-1 through 172-5 show an EquipmentResourceCreateRequestMessage_sync 172000 package. The EquipmentResourceCreateRequestMessage_sync 172000 package is an EquipmentResourceCreateRequestMessage_sync 172004 datatype. The EquipmentResourceCreateRequestMessage_sync 172000 package includes an EquipmentResourceCreateRequestMessage_sync 172002 entity. The EquipmentResourceCreateRequestMessage_sync 172000 package includes various packages, namely MessageHeader 172006, EquipmentResource 172020, Description 172050, Capacity 172058 and Reference 1720124.

The MessageHeader 172006 package is a BusinessDocumentMessageHeader 172012 datatype. The MessageHeader 172006 package includes a MessageHeader 172008 entity.

The MessageHeader 172008 entity has a cardinality of one 172010 meaning that for each instance of the EquipmentResourceCreateRequestMessage_sync 172002 entity there is one MessageHeader 172008 entity. The MessageHeader 172008 entity includes an ID 172014 attribute.

The ID 172014 attribute is a BusinessDocumentMessageID 172018 datatype. The ID 172014 attribute has a cardinality of one 172016 meaning that for each instance of the MessageHeader 172008 entity there is one ID 172014 attribute.

The EquipmentResource 172020 package includes an EquipmentResource 172022 entity.

The EquipmentResource 172022 entity has a cardinality of one 172024 meaning that for each instance of the EquipmentResourceCreateRequestMessage_sync 172002 entity there is one EquipmentResource 172022 entity. The EquipmentResource 172022 entity includes various attributes, namely ID 172026, FactoryCalendarCode 172030, CapacityCode 172034, CapacityMultipleIndicator 172038, InPastDuration 172042 and InFutureDuration 172046.

The ID 172026 attribute is a ResourceID 172028 datatype. The FactoryCalendarCode 172030 attribute is a WorkingDayCalendarCode 172032 datatype.

The CapacityCode 172034 attribute is a ResourceCapacityCode 172036 datatype. The CapacityMultipleIndicator 172038 attribute is a MultipleIndicator 172040 datatype.

The InPastDuration 172042 attribute is a DAY_Duration 172044 datatype.

The InFutureDuration 172046 attribute is a DAY_Duration 172048 datatype.

The Description 172050 package includes a Description 172052 entity.

The Description 172052 entity includes a Description 172054 attribute.

The Description 172054 attribute is a MEDIUM_Description 172056 datatype.

The Capacity 172058 package includes various entities, namely Downtime 172060 and CapacityAndSchedulingInformation 172074.

The Downtime 172060 entity includes various attributes, namely DowntimeReasonCode 172062, ResourceDowntimePeriod 172066 and Description 172070.

The DowntimeReasonCode 172062 attribute is a ResourceDowntimeReasonCode 172064 datatype.

The ResourceDowntimePeriod 172066 attribute is a DateTimePeriod 172068 datatype.

The Description 172070 attribute is a MEDIUM_Description 172072 datatype.

The CapacityAndSchedulingInformation 172074 entity includes various attributes, namely CapacityNumberValue 172076 and CapacityUtilizationPercent 172080. The CapacityAndSchedulingInformation 172074 entity has various subordinate entities, namely BucketCapacitySourceCode 172084, CapacityMeasureTypeCode 172086, CapacityMeasureUnitCode 172090, BucketCapacityNumberValue 172094, BucketCapacityMeasureTypeCode 172098, BucketCapacityMeasureUnitCode 1720102, NumberOfPeriods 1720106 and OperatingHours 1720110.

The CapacityNumberValue 172076 attribute is a NumberValue 172078 datatype.

The CapacityUtilizationPercent 172080 attribute is a Percent 172082 datatype.

The OperatingHours 1720110 entity includes various attributes, namely StartTimePoint 1720112, EndTimePoint 1720116 and BreakDuration 1720120.

The StartTimePoint 1720112 attribute is a TimePoint 1720114 datatype.

The EndTimePoint 1720116 attribute is a TimePoint 1720118 datatype.

The BreakDuration 1720120 attribute is a Time_Duration 1720122 datatype.

The Reference 1720124 package includes a Location 1720126 entity.

The Location 1720126 entity includes a LocationID 1720128 attribute.

The LocationID 1720128 attribute is a LocationID 1720130 datatype.

MessageHeader Package

A MessageHeader package groups the business information that is relevant for sending a business document in a message.

MessageHeader

A MessageHeader contains the information to identify a business document in a message from the perspective of the sending application.

EquipmentResource Package

EquipmentResource package groups the information relevant to describe an EquipmentResource.

EquipmentResource

An EquipmentResource is a permanently installed operating facility or a group of identical operating facilities that has the capacity to provide services. The elements located directly at the EquipmentResource node are ID, CapacityCode, CapacityMultipleIndicator, FactoryCalendarCode, InPastDuration, and InFutureDuration. The ID uniquely identifies the Equipment Resource. The CapacityCode is the Type of the Equipment Resource. The CapacityMultipleIndicator, which can be optional, indicates whether something is available multiple times or not, and it denotes whether the EquipmentResource can do multiple activities at the same time. The FactoryCalendarCode is the coded representation of a working day calendar for the resource. The InPastDuration is the duration in the past for which something to be done, and it denotes the start of the time-frame for the capacity generation. The InFutureDuration is the duration in the future for which something to be done, and it denotes the end of the time-frame for the capacity generation.

Description Package

Description

The Description is a natural-language text with additional information on an EquipmentResource. The elements located directly at the EquipmentResourceDescription node include the Description, which can be optional, is a language dependent description of the EquipmentResource.

Capacity Package

Downtime

The Downtime is the planned and unplanned downtime of an EquipmentResource that is relevant for planning purposes. Downtimes are non-working times for the resource. The elements located directly at the node EquipmentResourceDowntime are ReasonCode, Period, and Description. The ReasonCode is the Reason for the resource downtime. The Period is the Start and end date times for the resource downtime. The start date/time could be an expected or an actual date/time. The end date/time could be an expected or an actual date/time. The Description, which can be optional, is the Description of the EquipmentResource Downtime.

CapacityAndSchedulingInformation

The CapacityAndSchedulingInformation is a specification of the capacity offered by the EquipmentResource. The elements located directly at the EquipmentResourceCapacityAndSchedulingInformation node are CapacityNumberValue, CapacityUtilizationPercent, CapacityMeasureTypeCode, CapacityMeasureUnitCode, BucketCapacityNumberValue, PeriodNumberValue, BucketCapacityMeasureTypeCode, BucketCapacityMeasureUnitCode, and CapacityNumberValue. The CapacityNumberValue describes the capacity of the resource using a particular number of individual resources. The CapacityUtilizationPercent, which can be optional, denotes the utilization percentage of the EquipmentResource. The CapacityMeasureTypeCode, which can be optional, specifies in which dimension the resource is scheduled. The CapacityMeasureUnitCode, which can be optional, is the coded representation of the unit in which the capacity provided by the resource is measured. The BucketCapacityNumberValue, which can be optional, describes the bucket capacity of the resource. The PeriodNumberValue, which can be optional, is the number of days to which the bucket capacity applies. The BucketCapacityMeasureTypeCode, which can be optional, specifies in which dimension the resource is scheduled. The BucketCapacityMeasureUnitCode, which can be optional, is the coded representation of the unit in which the capacity provided by the resource is measured. CapacityNumberValue can be valid for multiple resources, whereas bucket capacity can be valid for mixed and bucket resource types.

Bucket capacity of a mixed resource can be maintained explicitly by specifying the number of periods and BucketCapacity or else it can also get it from the continuous capacity if there can be a dimension less continuous capacity value is specified.

OperatingHours

OperatingHours is the definition of working times of the EquipmentResource. The elements located directly at the OperatingHours node are StartTimePoint, EndTimePoint, and BreakDuration. The StartTimePoint is the Start Time for the Working Day. The EndTimePoint is the End Time for the Working Day. The BreakDuration is the Break Duration of the Working Day. Typically, values of 2 can be valid for StartTimePoint and EndTimePoint.

Message Data Type

The message data type EquipmentResourceCreateConfirmationMessage_sync contains the EquipmentResourceCreateConfirmation included in the business document and the business information that is relevant for sending a business document in a message.

FIG. 171 shows an EquipmentResourceCreateConfirmationMessage_sync 171000 package. The EquipmentResourceCreateConfirmationMessage_sync 171000 package is a <MessageDataType> 171004 datatype. The EquipmentResourceCreateConfirmationMessage_sync 171000 package includes an EquipmentResourceCreateConfirmationMessage_sync 171002 entity. The EquipmentResourceCreateConfirmationMessage_sync 171000 package includes various packages, namely MessageHeader 171006, EquipmentResource 171026 and Log 171038.

The MessageHeader 171006 package is a BusinessDocumentMessageHeader 171012 datatype. The MessageHeader 171006 package includes a MessageHeader 171008 entity.

The MessageHeader 171008 entity has a cardinality of one 171010 meaning that for each instance of the EquipmentResourceCreateConfirmationMessage_sync 171002 entity there is one MessageHeader 171008 entity. The MessageHeader 171008 entity includes various attributes, namely ID 171014 and CreationDateTime 171020.

The ID 171014 attribute is a BusinessDocumentMessageID 171018 datatype. The ID 171014 attribute has a cardinality of one 171016 meaning that for each instance of the MessageHeader 171008 entity there is one ID 171014 attribute.

The CreationDateTime 171020 attribute is a DateTime 171024 datatype. The CreationDateTime 171020 attribute has a cardinality of one 171022 meaning that for each instance of the MessageHeader 171008 entity there is one CreationDateTime 171020 attribute. The EquipmentResource 171026 package includes an EquipmentResource 171028 entity. The EquipmentResource 171028 entity has a cardinality of one 171030 meaning that for each instance of the EquipmentResourceCreateConfirmationMessage_sync 171002 entity there is one EquipmentResource 171028 entity. The EquipmentResource 171028 entity includes an ID 171032 attribute.

The ID 171032 attribute is a ResourceID 171036 datatype. The ID 171032 attribute has a cardinality of zero or one 171034 meaning that for each instance of the EquipmentResource 171028 entity there may be one ID 171032 attribute.

The Log 171038 package is a LOG 171044 datatype. The Log 171038 package includes a Log 171040 entity.

The Log 171040 entity has a cardinality of one 171042 meaning that for each instance of the EquipmentResourceCreateConfirmationMessage_sync 171002 entity there is one Log 171040 entity.

MessageHeader Package

A MessageHeader contains the information to identify a business document in a message from the perspective of the sending application.

EquipmentResource Package

EquipmentResource

An EquipmentResource is a permanently installed operating facility or a group of identical operating facilities that has the capacity to provide services.

Log Package

Log

A log is a sequence of messages that may result from the execution of an application task.

Message Data Type

The message data type EquipmentResourceChangeRequestMessage_sync contains the EquipmentResourceChangeRequest included in the business document and the business information that is relevant for sending a business document in a message.

FIGS. 170-1 through 170-4 show an EquipmentResourceChangeRequestMessage_sync 170000 package. The EquipmentResourceChangeRequestMessage_sync 170000 package is a <MessageDataType> 170004 datatype. The EquipmentResourceChangeRequestMessage_sync 170000 package includes an EquipmentResourceCreateRequestMessage_sync 170002 entity. The EquipmentResourceChangeRequestMessage_sync 170000 package includes various packages, namely MessageHeader 170006 and EquipmentResource 170020.

The MessageHeader 170006 package is a BusinessDocumentMessageHeader 170012 datatype. The MessageHeader 170006 package includes a MessageHeader 170008 entity.

The MessageHeader 170008 entity has a cardinality of one 170010 meaning that for each instance of the EquipmentResourceCreateRequestMessage_sync 170002 entity there is one MessageHeader 170008 entity. The MessageHeader 170008 entity includes an ID 170014 attribute.

The ID 170014 attribute is a BusinessDocumentMessageID 170018 datatype. The ID 170014 attribute has a cardinality of one 170016 meaning that for each instance of the MessageHeader 170008 entity there is one ID 170014 attribute.

The EquipmentResource 170020 package includes an EquipmentResource 170022 entity.

The EquipmentResource 170022 entity has a cardinality of one 170024 meaning that for each instance of the EquipmentResourceCreateRequestMessage_sync 170002 entity there is one EquipmentResource 170022 entity. The EquipmentResource 170022 entity includes various attributes, namely ID 170026, InPastDuration 170032 and InFutureDuration 170038. The EquipmentResource 170022 entity has various subordinate entities, namely Description 170044, Downtime 170052 and CapacityAndSchedulingInformation 170072.

The ID 170026 attribute is a ResourceID 170030 datatype. The ID 170026 attribute has a cardinality of one 170028 meaning that for each instance of the EquipmentResource 170022 entity there is one ID 170026 attribute.

The InPastDuration 170032 attribute is a DAY_Duration 170036 datatype. The InPastDuration 170032 attribute has a cardinality of zero or one 170034 meaning that for each instance of the EquipmentResource 170022 entity there may be one InPastDuration 170032 attribute.

The InFutureDuration 170038 attribute is a DAY_Duration 170042 datatype. The InFutureDuration 170038 attribute has a cardinality of zero or one 170040 meaning that for each instance of the EquipmentResource 170022 entity there may be one InFutureDuration 170038 attribute.

The Description 170044 entity includes an EquipmentResourceDescription 170046 attribute.

The EquipmentResourceDescription 170046 attribute is a MEDIUM_Description 170050 datatype. The EquipmentResourceDescription 170046 attribute has a cardinality of zero or one 170048 meaning that for each instance of the Description 170044 entity there may be one EquipmentResourceDescription 170046 attribute.

The Downtime 170052 entity includes various attributes, namely DowntimeReasonCode 170054, ResourceDowntimePeriod 170060 and DowntimeDescription 170066.

The DowntimeReasonCode 170054 attribute is a ResourceDowntimeReasonCode 170058 datatype. The DowntimeReasonCode 170054 attribute has a cardinality of zero or one 170056 meaning that for each instance of the Downtime 170052 entity there may be one DowntimeReasonCode 170054 attribute.

The ResourceDowntimePeriod 170060 attribute is a DateTimePeriod 170064 datatype. The ResourceDowntimePeriod 170060 attribute has a cardinality of zero or one 170062 meaning that for each instance of the Downtime 170052 entity there may be one ResourceDowntimePeriod 170060 attribute.

The DowntimeDescription 170066 attribute is a MEDIUM_Description 170070 datatype. The DowntimeDescription 170066 attribute has a cardinality of zero or one 170068 meaning that for each instance of the Downtime 170052 entity there may be one DowntimeDescription 170066 attribute.

The CapacityAndSchedulingInformation 170072 entity includes various attributes, namely CapacityNumberValue 170074 and CapacityUtilizationPercent 170080. The CapacityAndSchedulingInformation 170072 entity has various subordinate entities, namely BucketCapacitySourceCode 170086, CapacityMeasureTypeCode 170088, CapacityMeasureUnitCode 170094, BucketCapacityNumberValue 1700100, BucketCapacityMeasureTypeCode 1700106, BucketCapacityMeasureUnitCode 1700112, NumberOfPeriods 1700118 and OperatingHours 1700124.

The CapacityNumberValue 170074 attribute is a NumberValue 170078 datatype. The CapacityNumberValue 170074 attribute has a cardinality of zero or one 170076 meaning that for each instance of the CapacityAndSchedulingInformation 170072 entity there may be one CapacityNumberValue 170074 attribute.

The CapacityUtilizationPercent 170080 attribute is a Percent 170084 datatype. The CapacityUtilizationPercent 170080 attribute has a cardinality of zero or one 170082 meaning that for each instance of the CapacityAndSchedulingInformation 170072 entity there may be one CapacityUtilizationPercent 170080 attribute.

The CapacityMeasureTypeCode 170088 entity has a cardinality of zero or one 170090 meaning that for each instance of the CapacityAndSchedulingInformation 170072 entity there may be one CapacityMeasureTypeCode 170088 entity.

The CapacityMeasureUnitCode 170094 entity has a cardinality of zero or one 170096 meaning that for each instance of the CapacityAndSchedulingInformation 170072 entity there may be one CapacityMeasureUnitCode 170094 entity.

The BucketCapacityNumberValue 1700100 entity has a cardinality of zero or one 1700102 meaning that for each instance of the CapacityAndSchedulingInformation 170072 entity there may be one BucketCapacityNumberValue 1700100 entity.

The BucketCapacityMeasureTypeCode 1700106 entity has a cardinality of zero or one 1700108 meaning that for each instance of the CapacityAndSchedulingInformation 170072 entity there may be one BucketCapacityMeasureTypeCode 1700106 entity.

The BucketCapacityMeasureUnitCode 1700112 entity has a cardinality of zero or one 1700114 meaning that for each instance of the CapacityAndSchedulingInformation 170072 entity there may be one BucketCapacityMeasureUnitCode 1700112 entity.

The NumberOfPeriods 1700118 entity has a cardinality of zero or one 1700120 meaning that for each instance of the CapacityAndSchedulingInformation 170072 entity there may be one NumberOfPeriods 1700118 entity.

The OperatingHours 1700124 entity includes various attributes, namely StartTimePoint 1700126, EndTimePoint 1700132 and BreakDuration 1700138.

The StartTimePoint 1700126 attribute is a TimePoint 1700130 datatype. The StartTimePoint 1700126 attribute has a cardinality of zero or one 1700128 meaning that for each instance of the OperatingHours 1700124 entity there may be one StartTimePoint 1700126 attribute.

The EndTimePoint 1700132 attribute is a TimePoint 1700136 datatype. The EndTimePoint 1700132 attribute has a cardinality of zero or one 1700134 meaning that for each instance of the OperatingHours 1700124 entity there may be one EndTimePoint 1700132 attribute.

The BreakDuration 1700138 attribute is a TIME_Duration 1700142 datatype. The BreakDuration 1700138 attribute has a cardinality of zero or one 1700140 meaning that for each instance of the OperatingHours 1700124 entity there may be one BreakDuration 1700138 attribute.

MessageHeader Package

A MessageHeader contains the information to identify a business document in a message from the perspective of the sending application.

EquipmentResource Package

EquipmentResource

An EquipmentResource is an installed operating facility or a group of identical operating facilities that has the capacity to provide services. The elements located directly at the EquipmentResource node are ID, InPastDuration, InFutureDuration. ID uniquely identifies the Equipment Resource. InPastDuration, which can be optional, denotes the start of the time-frame for the generation. InFutureDuration, which can be optional, denotes the end of the time-frame for the generation.

Description Package

Description

The Description is a natural-language text with additional information on an EquipmentResource. The elements located directly at the EquipmentResourceDescription node can include Description, which can be optional. Description is a language dependent description of the EquipmentResource.

Downtime

The planned and unplanned downtime of an EquipmentResource that is relevant for planning purposes. Downtimes are non-working times for the resource. The elements located directly at the node EquipmentResourceDowntime are ReasonCode, Period, and Description. ReasonCode is the Reason for the resource downtime. Period is the Start and end date times for the resource downtime. The start date/time could be an expected or an actual date/time. The end date/time could be an expected or an actual date/time. Description, which can be optional, is the description of the Downtime.

CapacityAndSchedulingInformation

Specification of the capacity offered by the EquipmentResource. The elements located directly at the EquipmentResourceCapacityAndSchedulingInformation node are CapacityNumberValue, CapacityUtilizationPercent, CapacityMeasureTypeCode, CapacityMeasureUnitCode, BucketCapacityNumberValue, PeriodNumberValue, BucketCapacityMeasureTypeCode, and BucketCapacityMeasureUnitCode. CapacityNumberValue describes the capacity of the resource using a particular number of individual resources. CapacityUtilizationPercent, which can be optional, denotes the utilization percentage of the EquipmentResource. CapacityMeasureTypeCode, which can be optional, specifies in which dimension the resource is scheduled. CapacityMeasureUnitCode, which can be optional, is the coded representation of the unit in which the capacity provided by the resource is measured. BucketCapacityNumberValue, which can be optional, describes the bucket capacity of the resource. PeriodNumberValue, which can be optional, is the number of days to which the bucket capacity applies. BucketCapacityMeasureTypeCode, which can be optional, specifies in which dimension the resource is scheduled. BucketCapacityMeasureUnitCode, which can be optional, is the coded representation of the unit in which the capacity provided by the resource is measured. CapacityNumberValue, CapacityMeasureTypeCode, CapacityMeasureUnitCode can be valid for Multi/MultiMixed type resources. BucketCapacityNumberValue, PeriodNumberValue, BucketCapacityMeasureTypeCode, BucketCapacityMeasureUnitCode can be valid for Mixed and bucket type resources. If BucketCapacityNumberValue, PeriodNumberValue, BucketCapacityMeasureTypeCode, BucketCapacityMeasureUnitCode not mentioned then the bucket capacity is derived from continuous Capacity.

CapacityAndSchedulingInformationOperatingHours

OperatingHours is the definition of working times of the EquipmentResource. The elements located directly at the CapacityAndSchedulingInformation OperatingHours node are StartTimePoint EndTimePoint, BreakDuration. The StartTimePoint, which can be optional, is the start time for the working day. The EndTimePoint, which can be optional, is the end time for the working day. The BreakDuration, which can be optional, is the break duration of the working day. A value of 2 can be valid for StartTimePoint and EndTimePoint.

Message Data Type

The message data type EquipmentResourceChangeConfirmationMessage_sync contains the EquipmentResourceChangeConfirmation included in the business document and the business information that is relevant for sending a business document in a message.

FIG. 169 shows an EquipmentResourceChangeConfirmationMessage_sync 169000 package. The EquipmentResourceChangeConfirmationMessage_sync 169000 package is a <MessageDataType> 169004 datatype. The EquipmentResourceChangeConfirmationMessage_sync 169000 package includes an EquipmentResourceChangeConfirmationMessage_sync 169002 entity. The EquipmentResourceChangeConfirmationMessage_sync 169000 package includes various packages, namely MessageHeader 169006, EquipmentResource 169026 and Log 169038.

The MessageHeader 169006 package is a BusinessDocumentMessageHeader 169012 datatype. The MessageHeader 169006 package includes a MessageHeader 169008 entity.

The MessageHeader 169008 entity has a cardinality of one 169010 meaning that for each instance of the EquipmentResourceChangeConfirmationMessage_sync 169002 entity there is one MessageHeader 169008 entity. The MessageHeader 169008 entity includes various attributes, namely ID 169014 and CreationDateTime 169020.

The ID 169014 attribute is a BusinessDocumentMessageID 169018 datatype. The ID 169014 attribute has a cardinality of one 169016 meaning that for each instance of the MessageHeader 169008 entity there is one ID 169014 attribute.

The CreationDateTime 169020 attribute is a DateTime 169024 datatype. The CreationDateTime 169020 attribute has a cardinality of one 169022 meaning that for each instance of the MessageHeader 169008 entity there is one CreationDateTime 169020 attribute.

The EquipmentResource 169026 package includes an EquipmentResource 169028 entity.

The EquipmentResource 169028 entity has a cardinality of one 169030 meaning that for each instance of the EquipmentResourceChangeConfirmationMessage_sync 169002 entity there is one EquipmentResource 169028 entity. The EquipmentResource 169028 entity includes an ID 169032 attribute.

The ID 169032 attribute is a ResourceID 169036 datatype. The ID 169032 attribute has a cardinality of zero or one 169034 meaning that for each instance of the EquipmentResource 169028 entity there may be one ID 169032 attribute.

The Log 169038 package is a Log 169044 datatype. The Log 169038 package includes a Log 169040 entity.

The Log 169040 entity has a cardinality of one 169042 meaning that for each instance of the EquipmentResourceChangeConfirmationMessage_sync 169002 entity there is one Log 169040 entity.

MessageHeader Package

A MessageHeader contains the information to identify a business document in a message from the perspective of the sending application.

EquipmentResource Package

EquipmentResource

An EquipmentResource is a permanently installed operating facility or a group of identical operating facilities that has the capacity to provide services. The elements located directly at the EquipmentResource node can include the ID, which uniquely identifies the Equipment Resource.

Log Package

A log is a sequence of messages that may result from the execution of an application task.

Message Data Type

The message data type EquipmentResourceDeactivateRequestMessage_sync contains the EquipmentResourceDeactivateRequest included in the business document and the business information that is relevant for sending a business document in a message.

FIG. 174 shows an EquipmentResourceDeactivateRequestMessage_sync 174000 package. The EquipmentResourceDeactivateRequestMessage_sync 174000 package is a <MessageDataType> 174004 datatype. The EquipmentResourceDeactivateRequestMessage_sync 174000 package includes an EquipmentResourceDeactivateRequestMessage_sync 174002 entity. The EquipmentResourceDeactivateRequestMessage_sync 174000 package includes various packages, namely MessageHeader 174006 and EquipmentResource 174026.

The MessageHeader 174006 package is a BusinessDocumentMessageHeader 174012 datatype. The MessageHeader 174006 package includes a MessageHeader 174008 entity.

The MessageHeader 174008 entity has a cardinality of one 174010 meaning that for each instance of the EquipmentResourceDeactivateRequestMessage_sync 174002 entity there is one MessageHeader 174008 entity. The MessageHeader 174008 entity includes various attributes, namely ID 174014 and CreationDateTime 174020.

The ID 174014 attribute is a BusinessDocumentMessageID 174018 datatype. The ID 174014 attribute has a cardinality of one 174016 meaning that for each instance of the MessageHeader 174008 entity there is one ID 174014 attribute.

The CreationDateTime 174020 attribute is a DateTime 174024 datatype. The CreationDateTime 174020 attribute has a cardinality of one 174022 meaning that for each instance of the MessageHeader 174008 entity there is one CreationDateTime 174020 attribute.

The EquipmentResource 174026 package includes an EquipmentResource 174028 entity. The EquipmentResource 174028 entity has a cardinality of one 174030 meaning that for each instance of the EquipmentResourceDeactivateRequestMessage_sync 174002 entity there is one EquipmentResource 174028 entity. The EquipmentResource 174028 entity includes an ID 174032 attribute.

The ID 174032 attribute is a ResourceID 174036 datatype. The ID 174032 attribute has a cardinality of one 174034 meaning that for each instance of the EquipmentResource 174028 entity there is one ID 174032 attribute.

MessageHeader Package

A MessageHeader contains the information to identify a business document in a message from the perspective of the sending application.

EquipmentResourcePackage

EquipmentResource

An EquipmentResource is a permanently installed operating facility or a group of identical operating facilities that has the capacity to provide services.

Message Data Type

The message data type EquipmentResourceDeactivateConfirmationMessage_sync contains the EquipmentResourceDeactivateConfirmation included in the business document and the business information that is relevant for sending a business document in a message.

FIG. 173 shows an EquipmentResourceDeactivateConfirmationMessage_sync 173000 package. The EquipmentResourceDeactivateConfirmationMessage_sync 173000 package is a <MessageDataType> 173004 datatype. The EquipmentResourceDeactivateConfirmationMessage_sync 173000 package includes an EquipmentResourceDeactivateConfirmationMessage_sync 173002 entity. The EquipmentResourceDeactivateConfirmationMessage_sync 173000 package includes various packages, namely MessageHeader 173006, EquipmentResource 173028 and Log 173040.

The MessageHeader 173006 package is a BusinessDocumentMessageHeader 173012 datatype. The MessageHeader 173006 package includes a MessageHeader 173008 entity.

The MessageHeader 173008 entity has a cardinality of one 173010 meaning that for each instance of the EquipmentResourceDeactivateConfirmationMessage_sync 173002 entity there is one MessageHeader 173008 entity. The MessageHeader 173008 entity includes various attributes, namely ID 173014 and CreationDateTime 173020.

The ID 173014 attribute is a BusinessDocumentMessageID 173018 datatype. The ID 173014 attribute has a cardinality of one 173016 meaning that for each instance of the MessageHeader 173008 entity there is one ID 173014 attribute.

The CreationDateTime 173020 attribute is a DateTime 173024 datatype. The CreationDateTime 173020 attribute has a cardinality of one 173022 meaning that for each instance of the MessageHeader 173008 entity there is one CreationDateTime 173020 attribute.

The EquipmentResource 173028 package includes an EquipmentResource 173030 entity.

The EquipmentResource 173030 entity has a cardinality of one 173032 meaning that for each instance of the EquipmentResourceDeactivateConfirmationMessage_sync 173002 entity there is one EquipmentResource 173030 entity. The EquipmentResource 173030 entity includes an ID 173034 attribute.

The ID 173034 attribute is a ResourceID 173038 datatype. The ID 173034 attribute has a cardinality of zero or one 173036 meaning that for each instance of the EquipmentResource 173030 entity there may be one ID 173034 attribute.

The Log 173040 package is a Log 173046 datatype. The Log 173040 package includes a Log 173042 entity.

The Log 173042 entity has a cardinality of one 173044 meaning that for each instance of the EquipmentResourceDeactivateConfirmationMessage_sync 173002 entity there is one Log 173042 entity.

MessageHeader Package

A MessageHeader contains the information to identify a business document in a message from the perspective of the sending application.

EquipmentResource Package

EquipmentResource

An EquipmentResource is a permanently installed operating facility or a group of identical operating facilities that has the capacity to provide services.

Log Package

A log is a sequence of messages that may result from the execution of an application task.

Message Data Type

The message data type EquipmentResourceSimpleSelectionByLocationQueryMessage_sync contains the EquipmentResourceSimpleByLocationQuery included in the business document and the business information that is relevant for sending a business document in a message.

FIG. 176 shows an EquipmentResourceSimpleByLocationQueryMessage_sync 176000 package. The EquipmentResourceSimpleByLocationQueryMessage_sync 176000 package is a <MessageDataType> 176004 datatype. The EquipmentResourceSimpleByLocationQueryMessage_sync 176000 package includes an EquipmentResourceSimpleByLocationQueryMessage_sync 176002 entity. The EquipmentResourceSimpleByLocationQueryMessage_sync 176000 package includes a Selection 176006 package.

The Selection 176006 package includes an EquipmentResourceSelectionSimpleByLocation 176008 entity.

The EquipmentResourceSelectionSimpleByLocation 176008 entity has a cardinality of one 176010 meaning that for each instance of the EquipmentResourceSimpleByLocationQueryMessage_sync 176002 entity there is one EquipmentResourceSelectionSimpleByLocation 176008 entity. The EquipmentResourceSelectionSimpleByLocation 176008 entity includes a LocationID 176012 attribute.

The LocationID 176012 attribute is a LocationID 176016 datatype. The LocationID 176012 attribute has a cardinality of one 176014 meaning that for each instance of the EquipmentResourceSelectionSimpleByLocation 176008 entity there is one LocationID 176012 attribute.

Selection Package

EquipmentResourceSimpleSelectionByLocation

EquipmentResourceSelectionSimpleByLocationQuery contains selection criteria to select an EquipmentResources.

Message Data Type

The message data type EquipmentResourceSimpleByLocationResponseMessage_sync contains the EquipmentResourceSimpleByLocationResponse included in the business document and the business information that is relevant for sending a business document in a message.

FIG. 175 shows an EquipmentResourceSimpleByLocationResponseMessage_sync 175000 package. The EquipmentResourceSimpleByLocationResponseMessage_sync 175000 package is an EquipmentResourceSimpleByLocationResponse_sync 175006 datatype. The EquipmentResourceSimpleByLocationResponseMessage_sync 175000 package includes an EquipmentResourceSimpleByLocationResponseMessage_sync 175002 entity. The EquipmentResourceSimpleByLocationResponseMessage_sync 175000 package includes various packages, namely EquipmentResource 175008 and Log 175020.

The EquipmentResource 175008 package includes an EquipmentResource 175010 entity.

The EquipmentResource 175010 entity has a cardinality of one 175012 meaning that for each instance of the EquipmentResourceSimpleByLocationResponseMessage_sync 175002 entity there is one EquipmentResource 175010 entity. The EquipmentResource 175010 entity includes an ID 175014 attribute.

The ID 175014 attribute is a ResourceID 175018 datatype. The ID 175014 attribute has a cardinality of zero or n 175016 meaning that for each instance of the EquipmentResource 175010 entity there may be one or more ID 175014 attributes.

The Log 175020 package is a Log 175026 datatype. The Log 175020 package includes a Log 175022 entity.

The Log 175022 entity has a cardinality of one 175024 meaning that for each instance of the EquipmentResourceSimpleByLocationResponseMessage_sync 175002 entity there is one Log 175022 entity.

MessageHeader Package

A MessageHeader contains the information to identify a business document in a message from the perspective of the sending application.

EquipmentResource Package

EquipmentResource

An EquipmentResource is a permanently installed operating facility or a group of identical operating facilities that has the capacity to provide services.

Log Package

A log is a sequence of messages that may result from the execution of an application task.

Message Data Type

The message data type EquipmentResourceByIDQueryMessage_sync contains the EquipmentResourceByIDQuery included in the business document and the business information that is relevant for sending a business document in a message.

FIG. 167 shows an EquipmentResourceByIDQueryMessage_sync 167000 package. The EquipmentResourceByIDQueryMessage_sync 167000 package is an EquipmentResourceByIDQueryMessage_sync 167006 datatype. The EquipmentResourceByIDQueryMessage_sync 167000 package includes an EquipmentResourceByIDQueryMessage_sync 167002 entity. The EquipmentResourceByIDQueryMessage_sync 167000 package includes a Selection 167008 package.

The Selection 167008 package includes an EquipmentResourceSelectionByID 167010 entity.

The EquipmentResourceSelectionByID 167010 entity has a cardinality of one 167012 meaning that for each instance of the EquipmentResourceByIDQueryMessage_sync 167002 entity there is one EquipmentResourceSelectionByID 167010 entity. The EquipmentResourceSelectionByID 167010 entity includes an ID 167014 attribute.

The ID 167014 attribute is a ResourceID 167018 datatype. The ID 167014 attribute has a cardinality of one 167016 meaning that for each instance of the EquipmentResourceSelectionByID 167010 entity there is one ID 167014 attribute.

MessageHeader Package

A MessageHeader contains the information to identify a business document in a message from the perspective of the sending application.

Selection Package

EquipmentResourceSelectionByID

The EquipmentResourceSelectionByID is the ID of the EquipmentResource to be queried.

Message Data Type

The message data type EquipmentResourceByIDResponseMessage_sync contains the EquipmentResourceByIDResponse included in the business document and the business information that is relevant for sending a business document in a message. The EquipmentResource package groups the information relevant to describe an EquipmentResource.

FIGS. 168-1 through 168-8 show an EquipmentResourceByIDResponseMessage_sync 168000 package. The EquipmentResourceByIDResponseMessage_sync 168000 package is an EquipmentResourceByIDResponseMessage_sync> 168006 datatype. The EquipmentResourceByIDResponseMessage_sync 168000 package includes an EquipmentResourceByIDResponseMessage_sync 168002 entity. The EquipmentResourceByIDResponseMessage_sync 168000 package includes various packages, namely MessageHeader 168008, EquipmentResource 168022 and Log 1680220.

The MessageHeader 168008 package is a BusinessDocumentMessageHeader 168014 datatype. The MessageHeader 168008 package includes a MessageHeader 168010 entity.

The MessageHeader 168010 entity has a cardinality of one 168012 meaning that for each instance of the EquipmentResourceByIDResponseMessage_sync 168002 entity there is one MessageHeader 168010 entity. The MessageHeader 168010 entity includes an ID 168016 attribute.

The ID 168016 attribute is a BusinessDocumentMessageID 168020 datatype. The ID 168016 attribute has a cardinality of one 168018 meaning that for each instance of the MessageHeader 168010 entity there is one ID 168016 attribute.

The EquipmentResource 168022 package includes an EquipmentResource 168024 entity.

The EquipmentResource 168024 entity has a cardinality of one 168026 meaning that for each instance of the EquipmentResourceByIDResponseMessage_sync 168002 entity there is one EquipmentResource 168024 entity. The EquipmentResource 168024 entity includes various attributes, namely ID 168028, FactoryCalendarCode 168034, CapacityCode 168040, CapacityMultipleIndicator 168046, InPastDuration 168052 and InFutureDuration 168058. The EquipmentResource 168024 entity has various subordinate entities, namely Description 168064, Downtime 168074, CapacityAndSchedulingInformation 168094, CapacityCalendarItem 1680168 and Location 1680214.

The ID 168028 attribute is a ResourceID 168032 datatype. The ID 168028 attribute has a cardinality of one 168030 meaning that for each instance of the EquipmentResource 168024 entity there is one ID 168028 attribute.

The FactoryCalendarCode 168034 attribute is a WorkingDayCalendarCode 168038 datatype. The FactoryCalendarCode 168034 attribute has a cardinality of one 168036 meaning that for each instance of the EquipmentResource 168024 entity there is one FactoryCalendarCode 168034 attribute.

The CapacityCode 168040 attribute is a ResourceCapacityCode 168044 datatype. The CapacityCode 168040 attribute has a cardinality of one 168042 meaning that for each instance of the EquipmentResource 168024 entity there is one CapacityCode 168040 attribute.

The CapacityMultipleIndicator 168046 attribute is a MultipleIndicator 168050 datatype. The CapacityMultipleIndicator 168046 attribute has a cardinality of one 168048 meaning that for each instance of the EquipmentResource 168024 entity there is one CapacityMultipleIndicator 168046 attribute.

The InPastDuration 168052 attribute is a DAY_Duration 168056 datatype. The InPastDuration 168052 attribute has a cardinality of one 168054 meaning that for each instance of the EquipmentResource 168024 entity there is one InPastDuration 168052 attribute.

The InFutureDuration 168058 attribute is a DAY_Duration 168062 datatype. The InFutureDuration 168058 attribute has a cardinality of one 168060 meaning that for each instance of the EquipmentResource 168024 entity there is one InFutureDuration 168058 attribute.

The Description 168064 entity has a cardinality of zero or one 168066 meaning that for each instance of the EquipmentResource 168024 entity there may be one Description 168064 entity. The Description 168064 entity includes a Description 168068 attribute.

The Description 168068 attribute is a MEDIUM_Description 168072 datatype. The Description 168068 attribute has a cardinality of zero or one 168070 meaning that for each instance of the Description 168064 entity there may be one Description 168068 attribute.

The Downtime 168074 entity includes various attributes, namely DowntimeReasonCode 168076, ResourceDowntimePeriod 168082 and DowntimeDescription 168088.

The DowntimeReasonCode 168076 attribute is a ResourceDowntimeReasonCode 168080 datatype. The DowntimeReasonCode 168076 attribute has a cardinality of zero or one 168078 meaning that for each instance of the Downtime 168074 entity there may be one DowntimeReasonCode 168076 attribute.

The ResourceDowntimePeriod 168082 attribute is a DateTimePeriod 168086 datatype. The ResourceDowntimePeriod 168082 attribute has a cardinality of zero or one 168084 meaning that for each instance of the Downtime 168074 entity there may be one ResourceDowntimePeriod 168082 attribute.

The DowntimeDescription 168088 attribute is a MEDIUM_Description 168092 datatype. The DowntimeDescription 168088 attribute has a cardinality of zero or one 168090 meaning that for each instance of the Downtime 168074 entity there may be one DowntimeDescription 168088 attribute.

The CapacityAndSchedulingInformation 168094 entity includes various attributes, namely CapacityNumberValue 168096 and CapacityUtilizationPercent 1680102. The CapacityAndSchedulingInformation 168094 entity has various subordinate entities, namely BucketCapacitySourceCode 1680108, CapacityMeasureTypeCode 1680110, CapacityMeasureUnitCode 1680116, BucketCapacityNumberValue 1680122, BucketCapacityMeasureTypeCode 1680128, BucketCapacityMeasureUnitCode 1680134, NumberOfPeriods 1680140 and OperatingHours 1680146.

The CapacityNumberValue 168096 attribute is a NumberValue 1680100 datatype. The CapacityNumberValue 168096 attribute has a cardinality of one 168098 meaning that for each instance of the CapacityAndSchedulingInformation 168094 entity there is one CapacityNumberValue 168096 attribute.

The CapacityUtilizationPercent 1680102 attribute is a Percent 1680106 datatype. The CapacityUtilizationPercent 1680102 attribute has a cardinality of one 1680104 meaning that for each instance of the CapacityAndSchedulingInformation 168094 entity there is one CapacityUtilizationPercent 1680102 attribute.

The CapacityMeasureTypeCode 1680110 entity has a cardinality of one 1680112 meaning that for each instance of the CapacityAndSchedulingInformation 168094 entity there is one CapacityMeasureTypeCode 1680110 entity.

The CapacityMeasureUnitCode 1680116 entity has a cardinality of one 1680118 meaning that for each instance of the CapacityAndSchedulingInformation 168094 entity there is one CapacityMeasureUnitCode 1680116 entity.

The BucketCapacityNumberValue 1680122 entity has a cardinality of one 1680124 meaning that for each instance of the CapacityAndSchedulingInformation 168094 entity there is one BucketCapacityNumberValue 1680122 entity.

The BucketCapacityMeasureTypeCode 1680128 entity has a cardinality of one 1680130 meaning that for each instance of the CapacityAndSchedulingInformation 168094 entity there is one BucketCapacityMeasureTypeCode 1680128 entity.

The BucketCapacityMeasureUnitCode 1680134 entity has a cardinality of one 1680136 meaning that for each instance of the CapacityAndSchedulingInformation 168094 entity there is one BucketCapacityMeasureUnitCode 1680134 entity.

The NumberOfPeriods 1680140 entity has a cardinality of one 1680142 meaning that for each instance of the CapacityAndSchedulingInformation 168094 entity there is one NumberOfPeriods 1680140 entity.

The OperatingHours 1680146 entity has a cardinality of zero or one 1680148 meaning that for each instance of the CapacityAndSchedulingInformation 168094 entity there may be one OperatingHours 1680146 entity. The OperatingHours 1680146 entity includes various attributes, namely StartTimePoint 1680150, EndTimePoint 1680156 and BreakDuration 1680162.

The StartTimePoint 1680150 attribute is a StartTimePoint 1680154 datatype. The StartTimePoint 1680150 attribute has a cardinality of one 1680152 meaning that for each instance of the OperatingHours 1680146 entity there is one StartTimePoint 1680150 attribute.

The EndTimePoint 1680156 attribute is an EndTimePoint 1680160 datatype. The EndTimePoint 1680156 attribute has a cardinality of one 1680158 meaning that for each instance of the OperatingHours 1680146 entity there is one EndTimePoint 1680156 attribute.

The BreakDuration 1680162 attribute is a TIME_Duration 1680166 datatype. The BreakDuration 1680162 attribute has a cardinality of one 1680164 meaning that for each instance of the OperatingHours 1680146 entity there is one BreakDuration 1680162 attribute.

The CapacityCalendarItem 1680168 entity includes various attributes, namely Date 1680170, StartTimePoint 1680176, EndTimePoint 1680182, BreakDuration 1680188, ProductiveDuration 1680194, CapacityNumberValue 1680198, CapacityMeasureUnitCode 1680202, BucketCapacityNumberValue 1680206 and BucketMeasureUnitCode 1680210.

The Date 1680170 attribute is a Timepoint 1680174 datatype. The Date 1680170 attribute has a cardinality of one 1680172 meaning that for each instance of the CapacityCalendarItem 1680168 entity there is one Date 1680170 attribute.

The StartTimePoint 1680176 attribute is a StartTimePoint 1680180 datatype. The StartTimePoint 1680176 attribute has a cardinality of one 1680178 meaning that for each instance of the CapacityCalendarItem 1680168 entity there is one StartTimePoint 1680176 attribute.

The EndTimePoint 1680182 attribute is an EndTimePoint 1680186 datatype. The EndTimePoint 1680182 attribute has a cardinality of one 1680184 meaning that for each instance of the CapacityCalendarItem 1680168 entity there is one EndTimePoint 1680182 attribute.

The BreakDuration 1680188 attribute is a TIME_Duration 1680192 datatype. The BreakDuration 1680188 attribute has a cardinality of one 1680190 meaning that for each instance of the CapacityCalendarItem 1680168 entity there is one BreakDuration 1680188 attribute.

The ProductiveDuration 1680194 attribute is a Duration 1680196 datatype.

The CapacityNumberValue 1680198 attribute is a Value 1680200 datatype.

The CapacityMeasureUnitCode 1680202 attribute is a MeasureUnitCode 1680204 datatype.

The BucketCapacityNumberValue 1680206 attribute is a Value 1680208 datatype.

The BucketMeasureUnitCode 1680210 attribute is a MeasureUnitCode 1680212 datatype. The Location 1680214 entity includes a LocationID 1680216 attribute.

The LocationID 1680216 attribute is a LocationID 1680218 datatype.

The Log 1680220 package is a Log 1680224 datatype. The Log 1680220 package includes a Log 1680222 entity.

EquipmentResource Package

EquipmentResource

An EquipmentResource is a permanently installed operating facility or a group of identical operating facilities that has the capacity to provide services. The elements located directly at the EquipmentResource node are ID, CapacityCode, CapacityMultipleIndicator, FactoryCalendarCode, InPastDuration, and InFutureDuration. The ID uniquely identifies the Equipment Resource. The CapacityCode is the type of the Equipment Resource. The CapacityMultipleIndicator indicates whether something is available multiple times or not, and it denotes whether the EquipmentResource can do multiple activities at the same time. The FactoryCalendarCode is the coded representation of a working day calendar for the resource. The InPastDuration is the duration in the past for which something needs to be done, and it denotes the start of the time-frame for the capacity generation. The InFutureDuration is the duration in the future for which something needs to be done, and it denotes the end of the time-frame for the capacity generation.

Description Package

The Description is a natural-language text with additional information on an EquipmentResource.

Capacity Package

Downtime

The Downtime is the planned and unplanned downtime of an EquipmentResource that is relevant for planning purposes. Downtimes are non-working times for the resource. The elements located directly at the node EquipmentResourceDowntime are ReasonCode, Period, and Description. The ReasonCode is the reason for the resource downtime. The Period includes the start and end date times for the resource downtime. The start date/time could be an expected or an actual date/time. The end date/time could be an expected or an actual date/time. The Description, which can be optional, describes the EquipmentResource Downtime.

CapacityAndSchedulingInformation

The CapacityAndSchedulingInformation is the CapacityAndSchedulingInformationSpecification of the capacity offered by the EquipmentResource. The elements located directly at the EquipmentResourceCapacityAndSchedulingInformation node are CapacityNumberValue, CapacityUtilizationPercent, CapacityMeasureTypeCode, CapacityMeasureUnitCode, BucketCapacityNumberValue, PeriodNumberValue, BucketCapacityMeasureTypeCode, and BucketCapacityMeasureUnitCode. The CapacityNumberValue describes the capacity of the resource using a particular number of individual resources. The CapacityUtilizationPercent, which can be optional, denotes the utilization percentage of the EquipmentResource. The CapacityMeasureTypeCode, which can be optional, specifies in which dimension the resource is scheduled. The CapacityMeasureUnitCode, which can be optional, is the coded representation of the unit in which the capacity provided by the resource is measured. The BucketCapacityNumberValue, which can be optional, describes the bucket capacity of the resource. The PeriodNumberValue, which can be optional, is the number of days to which the bucket capacity applies. The BucketCapacityMeasureTypeCode, which can be optional, specifies in which dimension the resource is scheduled. The BucketCapacityMeasureUnitCode, which can be optional, is the Coded representation of the unit in which the capacity provided by the resource is measured.

CapacityNumberValue is valid for multi resources, whereas BucketCapacityNumberValue can be valid for mixed and bucket resource type. Bucket capacity of a mixed resource can be maintained explicitly by specifying the number of periods and BucketCapacity or else it can also get it from the capacity if there is a dimension less CapacityNumberValue is specified.

OperatingHours

OperatingHours is the definition of working times of the EquipmentResource. The elements located directly at the OperatingHours node are StartTimePoint, EndTimePoint, and BreakTimeDuration. The StartTimePoint is the Start Time for the Working Day. The EndTimePoint is the End Time for the Working Day. The BreakTimeDuration is the Break Duration of the Working Day. The value 2 can be valid for StartTimePoint and EndTimePoint.

CapacityCalendarItem

A capacity calendar item specifies a time-period given by two time points, which describes the available capacity for the EquipmentResource. The elements located directly at the CapacityAndSchedulingInformationCapacityCalendarItem node are Date, StartTimePoint, EndTimePoint, BreakDuration, ProductiveDuration, CapacityNumberValue, CapacityMeasureUnitCodet, BucketCapacityNumberValue, and BucketCapacityMeasureUnitCode. The Date is the date for which the capacity calendar item is shown. The StartTimePoint is the start time for the working day. The EndTimePoint is the End Time for the Working Day. The BreakDuration is the Break Duration of the Working Day. The ProductiveDuration denotes the productive duration of the resource. The CapacityNumberValue describes the capacity of the resource using a particular number of individual resources. The CapacityMeasureUnitCodet is the coded representation of the unit in which the capacity provided by the resource is measured. The BucketCapacityNumberValue describes the bucket capacity of the resource. The BucketCapacityMeasureUnitCode is the coded representation of the unit in which the capacity provided by the resource is measured. Bucket capacity can be relevant for the mixed resources. In the case of bucket capacity, start time can be relevant.

Log Package

A log is a sequence of messages that may result from the execution of an application task.

FundsManagementAccount Interface

FundsManagementAccount Interfaces are interfaces that are required for creation, maintenance and queries for FundsManagementAccount in Funds management. The motivation business scenario is to enable an employee to request the creation of a FundsManagementAccount. An employee who is responsible for creation of FundsManagementAccount (usually located in a central service department) will check if the request contains all relevant information, complete missing information if needed and inform requesting employee about the status of his request. After the information is completed the central employee will create the FundsManagementAccount in the Accounting using a service.

Message Choreography

The message choreography of FIG. 177 describes a possible logical sequence of messages that can be used to realize a finds management account business scenario. FundsManagementAccountCreateRequest_sync is a request to create a FundsManagementAccount. The structure of the message type FundsManagementAccountCreateRequest_sync is specified by the message data type FundsManagementAccountCreateRequestMessage_sync which is being derived from the message data type FundsManagementAccountMessage_sync.

FundsManagementAccountCreateConfirmation_sync is used to confirm the creation of a FundsManagementAccount. It is a response to FundsManagementAccountCreateRequest_sync. The structure of the message type FundsManagementAccountCreateConfirmation_sync is specified by the message data type FundsManagementAccountCreateConfirmationMessage_sync which is being derived from the message data type FundsManagementAccountMessage_sync.

FundsManagementAccountChangeRequest_sync is a request to change a FundsManagementAccount. The structure of the message type FundsManagementAccountChangeRequest_sync is specified by the message data type FundsManagementAccountChangeRequestMessage_sync which is being derived from the message data type FundsManagementAccountMessage_sync.

FundsManagementAccountChangeConfirmation_sync is used to confirm the change of a FundsManagementAccount. It is a response to FundsManagementAccountChangeRequest_sync.

The structure of the message type FundsManagementAccountChangeConfirmation_sync is specified by the message data type FundsManagementAccountChange- ConfirmationMessage__sync which is being derived from the message data type FundsManagementAccountMessage_sync.

FundsManagementAccountSimpleByElementsQuery_sync is an inquiry to accounting to list FundsManagementAccount identifiers that satisfy the selection criteria specified by the query elements. The structure of the message type FundsManagementAccountSimpleByElementsQuery_sync is specified by the message data type FundsManagementAccountSimpleByElementsQueryMessage_sync.

FundsManagementAccountSimpleByElementsResponse_sync is a response to FundsManagementAccountSimpleByElementsQuery_sync and contains identifying FundsManagementAccount information (ID, Description and Name). The structure of the message type FundsManagementAccountSimpleByElementsResponse_sync is specified by the message data type FundsManagementAccountSimpleByElementsResponseMessage_sync which is being derived from the message data type FundsManagementAccountMessage_sync.

FundsManagementAccountByIDQuery_sync is an inquiry to accounting for a FundsManagementAccount. The structure of the message type FundsManagementAccountByIDQuery_sync is specified by the message data type FundsManagementAccountByIDQueryMessage_sync.

FundsManagementAccountByIDResponse_sync is a response to FundsManagementAccountByIDQuery_sync and contains detailed information about a FundsManagementAccount. The structure of the message type FundsManagementAccountByIDResponse_sync is specified by the message data type FundsManagementAccountByIDResponseMessage_sync which is being derived from the message data type FundsManagementAccountMessage_sync.

For example, a "Budget Manager" system 177002 can query funds management accounts by elements using the FundsManagementAccountSimpleByElementsQuery_sync message 177006 as shown, for example, in FIG. 179. An "Accounting" system 177004 can respond to the query using the FundsManagementAccountSimpleByElementsResponse_sync message 177008. The "Budget Manager" system 177002 can request to create funds management accounts using the FundsManagementAccountCreateRequest_sync message 177010. The "Accounting" system 177004 can confirm the request using the FundsManagementAccountCreateConfirmation_sync message 177012. The "Budget Manager" system 177002 can query funds management accounts by ID using the FundsManagementAccountByIDQuery_sync message 177014 as shown, for example, in FIG. 178. The "Accounting" system 177004 can respond to the query using the FundsManagementAccountByIDResponse_sync message 177016. The "Budget Manager" system 177002 can request to create funds management accounts using the FundsManagementAccountChangeRequest_sync message 177018. The "Accounting" system 177004 can confirm the request using the FundsManagementAccountChangeConfirmation_sync message 177020.

Message Data Type

The message data type FundsManagementAccountMessage_sync contains the FundsManagementAccount included in the business document and the business information that is relevant for sending information, warning or error messages when processing operations for the FundsManagementAccount. The FundsManagementAccountMessage_sync is used as an abstract maximal message data type, which unifies all concrete message data types.

FIGS. 186-1 through 186-186 show a FundsManagementAccountMessage_sync 186000 package. The FundsManagementAccountMessage_sync 186000 package is a <MessageDataType> 186004 datatype. The FundsManagementAccountMessage_sync 186000 package includes a <MessageDataType> 186002 entity. The FundsManagementAccountMessage_sync 186000 package includes various packages, namely MessageHeader 186006 and Log 1860104.

The MessageHeader 186006 package is a BasicBusinessDocumentMessageHeader 186012 datatype. The MessageHeader 186006 package includes various entities, namely MessageHeader 186008 and FundsManagementAccount 186016. The MessageHeader 186006 package includes a FundsManagementAccount 186014 package.

The MessageHeader 186008 entity has a cardinality of zero or one 186010 meaning that for each instance of the <MessageDataType> 186002 entity there may be one MessageHeader 186008 entity.

The FundsManagementAccount 186016 entity has a cardinality of one 186018 meaning that for each instance of the <MessageDataType> 186002 entity there is one FundsManagementAccount 186016 entity. The FundsManagementAccount 186016 entity includes various attributes, namely FundsManagementAreaID 186020, FiscalYearID 186026, ID 186032, SuperiorFundsManagementAccountID 186038, CategoryCode 186044, CategoryName 186050, CarryForwardDestinationCode 186056, AuthorisationGroupCode 186062, ValidityPeriod 186068, PostingAllowedIndicator 186074, StatisticalPurposeUseIndicator 186080, FutureCashEffectivenessFiscalYearBudgetingAllowedIndicator 186086, Name 186092 and Description 186098.

The FundsManagementAreaID 186020 attribute is a FundsManagementAreaID 186024 datatype. The FundsManagementAreaID 186020 attribute has a cardinality of one 186022 meaning that for each instance of the FundsManagementAccount 186016 entity there is one FundsManagementAreaID 186020 attribute.

The FiscalYearID 186026 attribute is a FiscalYearID 186030 datatype. The FiscalYearID 186026 attribute has a cardinality of one 186028 meaning that for each instance of the FundsManagementAccount 186016 entity there is one FiscalYearID 186026 attribute.

The ID 186032 attribute is a FundsManagementAccountID 186036 datatype. The ID 186032 attribute has a cardinality of zero or one 186034 meaning that for each instance of the FundsManagementAccount 186016 entity there may be one ID 186032 attribute.

The SuperiorFundsManagementAccountID 186038 attribute is a FundsManagementAccountID 186042 datatype. The SuperiorFundsManagementAccountID 186038 attribute has a cardinality of zero or one 186040 meaning that for each instance of the FundsManagementAccount 186016 entity there may be one SuperiorFundsManagementAccountID 186038 attribute.

The CategoryCode 186044 attribute is a FundsManagementAccountCategoryCode 186048 datatype. The CategoryCode 186044 attribute has a cardinality of zero or one 186046 meaning that for each instance of the FundsManagementAccount 186016 entity there may be one CategoryCode 186044 attribute.

The CategoryName 186050 attribute is a LONG_Name 186054 datatype. The CategoryName 186050 attribute has a cardinality of zero or one 186052 meaning that for each instance of the FundsManagementAccount 186016 entity there may be one CategoryName 186050 attribute.

The CarryForwardDestinationCode 186056 attribute is a FundsManagementAccountCarryForwardDestinationCode 186060 datatype. The CarryForwardDestinationCode 186056 attribute has a cardinality of zero or one 186058 meaning that for each instance of the FundsManagementAccount 186016 entity there may be one CarryForwardDestinationCode 186056 attribute.

The AuthorisationGroupCode 186062 attribute is an AuthorisationGroupCode 186066 datatype. The AuthorisationGroupCode 186062 attribute has a cardinality of zero or one 186064 meaning that for each instance of the FundsManagementAccount 186016 entity there may be one AuthorisationGroupCode 186062 attribute.

The ValidityPeriod 186068 attribute is a CLOSED_DatePeriod 186072 datatype. The ValidityPeriod 186068 attribute has a cardinality of zero or one 186070 meaning that for each instance of the FundsManagementAccount 186016 entity there may be one ValidityPeriod 186068 attribute.

The PostingAllowedIndicator 186074 attribute is an AllowedIndicator 186078 datatype. The PostingAllowedIndicator 186074 attribute has a cardinality of zero or one 186076 meaning that for each instance of the FundsManagementAccount 186016 entity there may be one PostingAllowedIndicator 186074 attribute.

The StatisticalPurposeUseIndicator 186080 attribute is an UsedIndicator 186084 datatype. The StatisticalPurposeUseIndicator 186080 attribute has a cardinality of zero or one 186082 meaning that for each instance of the FundsManagementAccount 186016 entity there may be one StatisticalPurposeUseIndicator 186080 attribute.

The FutureCashEffectivenessFiscalYearBudgetingAllowedIndicator 186086 attribute is an AllowedIndicator 186090 datatype. The FutureCashEffectivenessFiscalYearBudgetingAllowedIndicator 186086 attribute has a cardinality of zero or one 186088 meaning that for each instance of the FundsManagementAccount 186016 entity there may be one FutureCashEffectivenessFiscalYearBudgetingAllowedIndicator 186086 attribute.

The Name 186092 attribute is a LEN20_Name 186096 datatype. The Name 186092 attribute has a cardinality of zero or one 186094 meaning that for each instance of the FundsManagementAccount 186016 entity there may be one Name 186092 attribute.

The Description 186098 attribute is a LEN150_Description 1860102 datatype. The Description 186098 attribute has a cardinality of zero or one 1860100 meaning that for each instance of the FundsManagementAccount 186016 entity there may be one Description 186098 attribute.

The FundsManagementAccount 186014 package includes a FundsManagementAccount 186016 entity.

The FundsManagementAccount 186016 entity has a cardinality of one 186018 meaning that for each instance of the <MessageDataType> 186002 entity there is one FundsManagementAccount 186016 entity. The FundsManagementAccount 186016 entity includes various attributes, namely FundsManagementAreaID 186020, FiscalYearID 186026, ID 186032, SuperiorFundsManagementAccountID 186038, CategoryCode 186044, CategoryName 186050, CarryForwardDestinationCode 186056, AuthorisationGroupCode 186062, ValidityPeriod 186068, PostingAllowedIndicator 186074, StatisticalPurposeUseIndicator 186080, FutureCashEffectivenessFiscalYearBudgetingAllowedIndicator 186086, Name 186092 and Description 186098.

The FundsManagementAreaID 186020 attribute is a FundsManagementAreaID 186024 datatype. The FundsManagementAreaID 186020 attribute has a cardinality of one 186022 meaning that for each instance of the FundsManagementAccount 186016 entity there is one FundsManagementAreaID 186020 attribute.

The FiscalYearID 186026 attribute is a FiscalYearID 186030 datatype. The FiscalYearID 186026 attribute has a cardinality of one 186028 meaning that for each instance of the FundsManagementAccount 186016 entity there is one FiscalYearID 186026 attribute.

The ID 186032 attribute is a FundsManagementAccountID 186036 datatype. The ID 186032 attribute has a cardinality of zero or one 186034 meaning that for each instance of the FundsManagementAccount 186016 entity there may be one ID 186032 attribute.

The SuperiorFundsManagementAccountID 186038 attribute is a FundsManagementAccountID 186042 datatype. The SuperiorFundsManagementAccountID 186038 attribute has a cardinality of zero or one 186040 meaning that for each instance of the FundsManagementAccount 186016 entity there may be one SuperiorFundsManagementAccountID 186038 attribute.

The CategoryCode 186044 attribute is a FundsManagementAccountCategoryCode 186048 datatype. The CategoryCode 186044 attribute has a cardinality of zero or one 186046 meaning that for each instance of the FundsManagementAccount 186016 entity there may be one CategoryCode 186044 attribute.

The CategoryName 186050 attribute is a LONG_Name 186054 datatype. The CategoryName 186050 attribute has a cardinality of zero or one 186052 meaning that for each instance of the FundsManagementAccount 186016 entity there may be one CategoryName 186050 attribute.

The CarryForwardDestinationCode 186056 attribute is a FundsManagementAccountCarryForwardDestinationCode 186060 datatype. The CarryForwardDestinationCode 186056 attribute has a cardinality of zero or one 186058 meaning that for each instance of the FundsManagementAccount 186016 entity there may be one CarryForwardDestinationCode 186056 attribute.

The AuthorisationGroupCode 186062 attribute is an AuthorisationGroupCode 186066 datatype. The AuthorisationGroupCode 186062 attribute has a cardinality of zero or one 186064 meaning that for each instance of the FundsManagementAccount 186016 entity there may be one AuthorisationGroupCode 186062 attribute.

The ValidityPeriod 186068 attribute is a CLOSED_DatePeriod 186072 datatype. The ValidityPeriod 186068 attribute has a cardinality of zero or one 186070 meaning that for each instance of the FundsManagementAccount 186016 entity there may be one ValidityPeriod 186068 attribute.

The PostingAllowedIndicator 186074 attribute is an AllowedIndicator 186078 datatype. The PostingAllowedIndicator 186074 attribute has a cardinality of zero or one 186076 meaning that for each instance of the FundsManagementAccount 186016 entity there may be one PostingAllowedIndicator 186074 attribute.

The StatisticalPurposeUseIndicator 186080 attribute is an UsedIndicator 186084 datatype. The StatisticalPurposeUseIndicator 186080 attribute has a cardinality of zero or one 186082 meaning that for each instance of the FundsManagementAccount 186016 entity there may be one StatisticalPurposeUseIndicator 186080 attribute.

The FutureCashEffectivenessFiscalYearBudgetingAllowedIndicator 186086 attribute is an AllowedIndicator 186090 datatype. The FutureCashEffectivenessFiscalYearBudgetingAllowedIndicator 186086 attribute has a cardinality of zero or one 186088 meaning that for each instance of the FundsManagementAccount 186016 entity there may be one FutureCashEffectivenessFiscalYearBudgetingAllowedIndicator 186086 attribute.

The Name 186092 attribute is a LEN20_Name 186096 datatype. The Name 186092 attribute has a cardinality of zero or one 186094 meaning that for each instance of the FundsManagementAccount 186016 entity there may be one Name 186092 attribute.

The Description 186098 attribute is a LEN150_Description 1860102 datatype. The Description 186098 attribute has a cardinality of zero or one 1860100 meaning that for each instance of the FundsManagementAccount 186016 entity there may be one Description 186098 attribute.

The Log 1860104 package is a Log 1860110 datatype. The Log 1860104 package includes a Log 1860106 entity.

The Log 1860106 entity has a cardinality of zero or one 1860108 meaning that for each instance of the <MessageDataType> 186002 entity there may be one Log 1860106 entity.

MessageHeader Package

A MessageHeader package groups the business information that is relevant for sending a business document in a message. It contains the MessageHeader entity.

MessageHeader

A MessageHeader groups business information from the perspective of the sending application.

FundsManagementAccount Package

The FundsManagementAccount package contains information about FundsManagementAccount. The FundsManagementAccount package contains the entity FundsManagementAccount.

FundsManagementAccount

A FundsManagementAccount denotes a grouping of revenues and expenditures by their nature. The entity FundsManagementAccount contains attributes of FundsManagementAccount. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount. FundsManagementAccountID is a unique identifier of the SuperiorFundsManagementAccount in the hierarchy of FundsManagementAccounts. FundsManagementAccountCategoryCode is a coded representation of a FundsManagementAccountCategory. FundsManagementAccountCategoryName is the name of the FundsManagementAccountCategory. AuthorisationGroupCode is a coded representation of an authorisation group. Validity period is a validity period of the funds management account. PostingAllowedIndicator indicates whether it is allowed to post on the FundsManagementAccount or not. StatisticalPurposeIndicator indicates whether the FundsManagementAccount is only used for statistical purpose. Such FundsManagementAccount cannot be budgeted. FundsManagementAccountBalanceCarryForwardDestination is used to cumulate the balances of the actual values of previous year's Funds Management Accounts to one or several Funds Management Accounts in the following year. FutureCashEffectivenessFiscalYearBudgetingAllowedIndicator indicates whether it is allowed to enter budget on the FundsManagementAccount for the CashEffectivenessFiscalYear greater than current FiscalYear. Name is the name of the FundsManagementAccount. Description is the description of the FundsManagementAccount.

Log Package

A Log package groups the error messages used for user interaction. It contains the Log entity.

Log

A Log is a sequence of messages that result when an application executes a task. The Log package is only used in the message data types used for outbound messages from the perspective of the Funds Management System. Therefore only the message types FundsManagementAccountSimpleSimpleByElementsResponse_sync, FundsManagementAccountCreateConfirmation_sync, FundsManagementAccountChangeConfirmation_sync, and FundsManagementAccountByIDResponse_sync are using this package.

Message Data Type

The message data type FundsManagementAccountCreateRequestMessage_sync is being derived from the message data type FundsManagementAccountMessage_sync.

FIGS. 185-1 through 185-3 show a FundsManagementAccountCreateRequestMessage_sync 185000 package. The FundsManagementAccountCreateRequestMessage_sync 185000 package is a <MessageDataType> 185006 datatype. The FundsManagementAccountCreateRequestMessage_sync 185000 package includes a <MessageDataType> 185002 entity. The FundsManagementAccountCreateRequestMessage_sync 185000 package includes a MessageHeader 185008 package.

The MessageHeader 185008 package is a BasicBusinessDocumentMessageHeader 185016 datatype. The MessageHeader 185008 package includes various entities, namely MessageHeader 185010 and FundsManagementAccount 185020. The MessageHeader 185008 package includes a FundsManagementAccount 185018 package.

The MessageHeader 185010 entity has a cardinality of zero or one 185012 meaning that for each instance of the <MessageDataType> 185002 entity there may be one MessageHeader 185010 entity.

The FundsManagementAccount 185020 entity has a cardinality of one 185022 meaning that for each instance of the <MessageDataType> 185002 entity there is one FundsManagementAccount 185020 entity. The FundsManagementAccount 185020 entity includes various attributes, namely FundsManagementAreaID 185026, FiscalYearID 185034, ID 185042, SuperiorFundsManagementAccountID 185050, CategoryCode 185058, BalanceCarryForwardDestinationCode 185066, AuthorisationGroupCode 185074, ValidityPeriod 185082, PostingAllowedIndicator 185090, StatisticalPurposeUseIndicator 185098, FutureCashEffectivenessFiscalYearBudgetingAllowedIndicator 1850106, Name 1850114 and Description 1850122.

The FundsManagementAreaID 185026 attribute is a FundsManagementAreaID 185032 datatype. The FundsManagementAreaID 185026 attribute has a cardinality of one 185028 meaning that for each instance of the FundsManagementAccount 185020 entity there is one FundsManagementAreaID 185026 attribute.

The FiscalYearID 185034 attribute is a FiscalYearID 185040 datatype. The FiscalYearID 185034 attribute has a cardinality of one 185036 meaning that for each instance of the FundsManagementAccount 185020 entity there is one FiscalYearID 185034 attribute.

The ID 185042 attribute is a FundsManagementAccountID 185048 datatype. The ID 185042 attribute has a cardinality of one 185044 meaning that for each instance of the FundsManagementAccount 185020 entity there is one ID 185042 attribute.

The SuperiorFundsManagementAccountID 185050 attribute is a FundsManagementAccountID 185056 datatype. The SuperiorFundsManagementAccountID 185050 attribute has a cardinality of zero or one 185052 meaning that for each instance of the FundsManagementAccount 185020 entity there may be one SuperiorFundsManagementAccountID 185050 attribute.

The CategoryCode 185058 attribute is a FundsManagementAccountCategoryCode 185064 datatype. The CategoryCode 185058 attribute has a cardinality of one 185060 meaning that for each instance of the FundsManagementAccount 185020 entity there is one CategoryCode 185058 attribute.

The BalanceCarryForwardDestinationCode 185066 attribute is a FundsManagementAccountCarryForwardDestinationCode 185072 datatype. The BalanceCarryForwardDestinationCode 185066 attribute has a cardinality of zero or one 185068 meaning that for each instance of the FundsManagementAccount 185020 entity there may be one BalanceCarryForwardDestinationCode 185066 attribute.

The AuthorisationGroupCode 185074 attribute is an AuthorisationGroupCode 185080 datatype. The AuthorisationGroupCode 185074 attribute has a cardinality of zero or one 185076 meaning that for each instance of the FundsManagementAccount 185020 entity there may be one AuthorisationGroupCode 185074 attribute.

The ValidityPeriod 185082 attribute is a CLOSED_DatePeriod 185088 datatype. The ValidityPeriod 185082 attribute has a cardinality of zero or one 185084 meaning that for each instance of the FundsManagementAccount 185020 entity there may be one ValidityPeriod 185082 attribute.

The PostingAllowedIndicator 185090 attribute is an AllowedIndicator 185096 datatype. The PostingAllowedIndicator 185090 attribute has a cardinality of one 185092 meaning that for each instance of the FundsManagementAccount 185020 entity there is one PostingAllowedIndicator 185090 attribute.

The StatisticalPurposeUseIndicator 185098 attribute is an UsedIndicator 1850104 datatype. The StatisticalPurposeUseIndicator 185098 attribute has a cardinality of one 1850100 meaning that for each instance of the FundsManagementAccount 185020 entity there is one StatisticalPurposeUseIndicator 185098 attribute.

The FutureCashEffectivenessFiscalYearBudgetingAllowedIndicator 1850106 attribute is an AllowedIndicator 1850112 datatype. The FutureCashEffectivenessFiscalYearBudgetingAllowedIndicator 1850106 attribute has a cardinality of one 1850108 meaning that for each instance of the FundsManagementAccount 185020 entity there is one FutureCashEffectivenessFiscalYearBudgetingAllowedIndicator 1850106 attribute.

The Name 1850114 attribute is a LEN20_Name 1850120 datatype. The Name 1850114 attribute has a cardinality of one 1850116 meaning that for each instance of the FundsManagementAccount 185020 entity there is one Name 1850114 attribute.

The Description 1850122 attribute is a LEN150_Description 1850128 datatype. The Description 1850122 attribute has a cardinality of zero or one 1850124 meaning that for each instance of the FundsManagementAccount 185020 entity there may be one Description 1850122 attribute.

The FundsManagementAccount 185018 package includes a FundsManagementAccount 185020 entity.

The FundsManagementAccount 185020 entity has a cardinality of one 185022 meaning that for each instance of the <MessageDataType> 185002 entity there is one FundsManagementAccount 185020 entity. The FundsManagementAccount 185020 entity includes various attributes, namely FundsManagementAreaID 185026, FiscalYearID 185034, ID 185042, SuperiorFundsManagementAccountID 185050, CategoryCode 185058, BalanceCarryForwardDestinationCode 185066, AuthorisationGroupCode 185074, ValidityPeriod 185082, PostingAllowedIndicator 185090, StatisticalPurposeUseIndicator 185098, FutureCashEffectivenessFiscalYearBudgetingAllowedIndicator 1850106, Name 1850114 and Description 1850122.

The FundsManagementAreaID 185026 attribute is a FundsManagementAreaID 185032 datatype. The FundsManagementAreaID 185026 attribute has a cardinality of one 185028 meaning that for each instance of the FundsManagementAccount 185020 entity there is one FundsManagementAreaID 185026 attribute.

The FiscalYearID 185034 attribute is a FiscalYearID 185040 datatype. The FiscalYearID 185034 attribute has a cardinality of one 185036 meaning that for each instance of the FundsManagementAccount 185020 entity there is one FiscalYearID 185034 attribute.

The ID 185042 attribute is a FundsManagementAccountID 185048 datatype. The ID 185042 attribute has a cardinality of one 185044 meaning that for each instance of the FundsManagementAccount 185020 entity there is one ID 185042 attribute.

The SuperiorFundsManagementAccountID 185050 attribute is a FundsManagementAccountID 185056 datatype. The SuperiorFundsManagementAccountID 185050 attribute has a cardinality of zero or one 185052 meaning that for each instance of the FundsManagementAccount 185020 entity there may be one SuperiorFundsManagementAccountID 185050 attribute.

The CategoryCode 185058 attribute is a FundsManagementAccountCategoryCode 185064 datatype. The CategoryCode 185058 attribute has a cardinality of one 185060 meaning that for each instance of the FundsManagementAccount 185020 entity there is one CategoryCode 185058 attribute.

The BalanceCarryForwardDestinationCode 185066 attribute is a FundsManagementAccountCarryForwardDestinationCode 185072 datatype. The BalanceCarryForwardDestinationCode 185066 attribute has a cardinality of zero or one 185068 meaning that for each instance of the FundsManagementAccount 185020 entity there may be one BalanceCarryForwardDestinationCode 185066 attribute.

The AuthorisationGroupCode 185074 attribute is an AuthorisationGroupCode 185080 datatype. The AuthorisationGroupCode 185074 attribute has a cardinality of zero or one 185076 meaning that for each instance of the FundsManagementAccount 185020 entity there may be one AuthorisationGroupCode 185074 attribute.

The ValidityPeriod 185082 attribute is a CLOSED_DatePeriod 185088 datatype. The ValidityPeriod 185082 attribute has a cardinality of zero or one 185084 meaning that for each instance of the FundsManagementAccount 185020 entity there may be one ValidityPeriod 185082 attribute.

The PostingAllowedIndicator 185090 attribute is an AllowedIndicator 185096 datatype. The PostingAllowedIndicator 185090 attribute has a cardinality of one 185092 meaning that for each instance of the FundsManagementAccount 185020 entity there is one PostingAllowedIndicator 185090 attribute.

The StatisticalPurposeUseIndicator 185098 attribute is an UsedIndicator 1850104 datatype. The StatisticalPurposeUseIndicator 185098 attribute has a cardinality of one 1850100 meaning that for each instance of the FundsManagementAccount 185020 entity there is one StatisticalPurposeUseIndicator 185098 attribute.

The FutureCashEffectivenessFiscalYearBudgetingAllowedIndicator 1850106 attribute is an AllowedIndicator 1850112 datatype. The FutureCashEffectivenessFiscalYearBudgetingAllowedIndicator 1850106 attribute has a cardinality of one 1850108 meaning that for each instance of the FundsManagementAccount 185020 entity there is one FutureCashEffectivenessFiscalYearBudgetingAllowedIndicator 1850106 attribute.

The Name 1850114 attribute is a LEN20_Name 1850120 datatype. The Name 1850114 attribute has a cardinality of one 1850116 meaning that for each instance of the FundsManagementAccount 185020 entity there is one Name 1850114 attribute.

The Description 1850122 attribute is a LEN150_Description 1850128 datatype. The Description 1850122 attribute has a cardinality of zero or one 1850124 meaning that for each instance of the FundsManagementAccount 185020 entity there may be one Description 1850122 attribute.

FundsManagementAccount

The entity FundsManagementAccount contains attributes of FundsManagementAccount. A FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount. FundsManagementAccountID is a unique identifier of the SuperiorFundsManagementAccount in the hierarchy of FundsManagementAccounts.

FundsManagementAccountCategoryCode is a coded representation of a FundsManagementAccountCategory. AuthorisationGroupCode is a coded representation of an authorisation group. Validity period is a validity period of the funds management account. PostingAllowedIndicator indicates whether it is allowed to post on the FundsManagementAccount or not. StatisticalPurposeIndicator indicates whether the FundsManagementAccount is only used for statistical purpose. Such FundsManagementAccount cannot be budgeted. FundsManagementAccountBalanceCarryForwardDestination is used to cumulate the balances of the actual values of previous year's Funds Management Accounts to one or several Funds Management Accounts in the following year. FutureCashEffectivenessFiscalYearBudgetingAllowedIndicator indicates whether it is allowed to enter budget on the FundsManagementAccount for the CashEffectivenessFiscalYear greater than current FiscalYear. Name is the name of the FundsManagementAccount. Description is the description of the FundsManagementAccount Message Data Type The message data type FundsManagementAccountCreateConfirmationMessage_sync is being derived from the message data type FundsManagementAccountMessage_sync.

FundsManagementAccount

The entity FundsManagementAccount contains attributes of FundsManagementAccount.

FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount.

Message Data Type FundsManagementAccountChangeRequestMessage_sync

The message data type FundsManagementAccountChangeRequestMessage_sync is being derived from the message data type FundsManagementAccountMessage_sync.

Package FundsManagementAccount

FundsManagementAccount

The entity FundsManagementAccount contains attributes of FundsManagementAccount. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount. FundsManagementAccountID is a unique identifier of the SuperiorFundsManagementAccount in the hierarchy of FundsManagementAccounts.

FundsManagementAccountCategoryCode is a coded representation of a FundsManagementAccountCategory. AuthorisationGroupCode is a coded representation of an authorisation group. Validity period is a validity period of the funds management account. StatisticalPurposeIndicator indicates whether the FundsManagementAccount is only used for statistical purpose. Such FundsManagementAccount cannot be budgeted. FundsManagementAccountBalanceCarryForwardDestination is used to cumulate the balances of the actual values of previous year's Funds Management Accounts to one or several Funds Management Accounts in the following year. FutureCashEffectivenessFiscalYearBudgetingAllowedIndicator indicates whether it is allowed to enter budget on the FundsManagementAccount for the CashEffectivenessFiscalYear greater than current FiscalYear. Name is the name of the FundsManagementAccount. Description is the description of the FundsManagementAccount.

Message Data Type

The message data type FundsManagementAccountChangeConfirmationMessage_sync is being derived from the message data type FundsManagementAccountMessage_sync.

Package FundsManagementAccount

FundsManagementAccount

The entity FundsManagementAccount contains attributes of FundsManagementAccount.

FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount.

Message Data Type

The message data type FundsManagementAccountSimpleByElementsQueryMessage_sync contains the Selection included in the business document. It contains the Selection package.

Selection Package

Selection contains the FundsManagementAccountSimpleSelectionByElements entity.

FundsManagementAccountSimpleSelectionByElements

The FundsManagementAccountSimpleSelectionByElements specifies elements for selection of identifying FundsManagementAccount information. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount FundsManagementAccountID is a unique identifier of the SuperiorFundsManagementAccount in the hierarchy of FundsManagementAccounts. FundsManagementAccountCategoryCode is a coded representation of a FundsManagementAccountCategory. AuthorisationGroupCode is a coded representation of an authorisation group. Validity period is a validity period of the funds management account. PostingAllowedIndicator indicates whether it is allowed to post on the FundsManagementAccount or not. StatisticalPurposeIndicator indicates whether the FundsManagementAccount is only used for statistical purpose. Such FundsManagementAccount cannot be budgeted. FundsManagementAccountBalanceCarryForwardDestination is used to cumulate the balances of the actual values of previous year's Funds Management Accounts to one or several Funds Management Accounts in the following year. FutureCashEffectivenessFiscalYearBudgetingAllowedIndicator indicates whether it is allowed to enter budget on the FundsManagementAccount for the CashEffectivenessFiscalYear greater than current FiscalYear. Name is the name of the FundsManagementAccount. Description is the description of the FundsManagementAccount. SelectionByFiscalYear is a range of FiscalYear Identifiers. InclusionExclusionCode is a coded representation of the inclusion of a set into a result set or the exclusion of it. IntervalBoundaryTypeCode is a coded representation of an interval boundary type. LowerBoundaryFiscalYearID is a proprietary identifier for a FiscalYear. The LowerBoundaryFiscalYearID is the lower boundary of the FiscalYear identifier interval.

UpperBoundaryFiscalYearID is a proprietary identifier for a FiscalYear. The UpperBoundaryFiscalYearID is the upper boundary of the FiscalYear identifier interval. SelectionByFundsManagementAccountID is a range of FundsManagementAccount Identifiers. LowerBoundaryFundsManagementAccountID is a proprietary identifier for a FundsManagementAccount. The LowerBoundaryFundsManagementAccountID is the lower boundary of the FundsManagementAccountID identifier interval. UpperBoundaryFundsManagementAccountID is a proprietary identifier for a FundsManagementAccount. The UpperBoundaryFundsManagementAccountID is the upper boundary of the FundsManagementAccountID identifier interval. SelectionByFundsManagementAccountCategoryCode is a range of FundsManagementAccount Categories. LowerBoundaryFundsManagementAccountCategoryCode is a category of a FundsManagementAccount. The LowerBoundaryFundsManagementAccountCategoryCode is the lower boundary of the FundsManagementAccountCategoryCode interval. UpperBoundaryFundsManagementAccountCategoryCode is a category of a FundsManagementAccount. The UpperBoundaryFundsManagementAccountCategoryCode is the upper boundary of the FundsManagementAccountCategoryCode interval. SelectionByFundsManagementAccountBalanceCarryForwardDestinationCode is a range of FundsManagementAccountBalanceCarryForwardDestinations.

LowerBoundaryFundsManagementAccountBalanceCarryForwardDestinationCode is the lower boundary of the FundsManagementAccountBalanceCarryForwardDestinationCode interval. UpperBoundaryFundsManagementAccountBalanceCarryForwardDestinationCode is the upper boundary of the FundsManagementAccountBalanceCarryForwardDestinationCode interval. SelectionByAuthorisationGroupCode is a range of authorisation group codes. AuthorisationGroupCode is a coded representation of an authorisation group. LowerBoundaryAuthorisationGroupCode is the lower boundary of the AuthorisationGroupCode interval. UpperBoundaryAuthorisationGroupCode is the UpperBoundary AuthorisationGroupCode is the upper boundary of the AuthorisationGroupCode interval. SelectionByValidityStartDate is a range of validity start dates. LowerBoundaryValidityStartDate is a validity start date of a FundsManagementAccount. LowerBoundaryValidityStartDate is the lower boundary of the ValidityStartDate interval. UpperBoundaryValidityStartDate is the upper boundary of the ValidityStartDate interval. SelectionByValidityEndDate is a range of validity end dates. LowerBoundaryValidityEndDate is a validity end date of a FundsManagementAccount. The LowerBoundaryValidityEndDate is the lower boundary of the ValidityEndDate interval. UpperBoundaryValidityEndDate is a validity end date of a FundsManagementAccount. UpperBoundaryValidityEndDate is the upper boundary of the ValidityEndDate interval. SelectionByFundsManagementAccountName is a range of FundsManagementAccount Names.

LowerBoundaryFundsManagementAccountName is a name of FundsManagementAccount. LowerBoundaryFundsManagementAccountName is the lower boundary of the FundsManagementAccountName interval. UpperBoundaryFundsManagementAccountName is a name of a FundsManagementAccount. UpperBoundaryFundsManagementAccountName is the upper boundary of the FundsManagementAccountName interval. SelectionByFundsManagementAccountDescription is a range of FundsManagementAccount Descriptions. LowerBoundaryFundsManagementAccountDescription is a description of a FundsManagementAccount. LowerBoundaryFundsManagementAccountDescription is the lower boundary of the FundsManagementAccountDescription interval. UpperBoundaryFundsManagementAccountDescription is a description of a FundsManagementAccount. The UpperBoundaryFundsManagementAccountDescription is the upper boundary of the FundsManagementAccountDescription interval.

The selection using single fields has the priority over the selection of the interval (e.g. if the consumer of the message fills both ValidityEndDate and SelectionByValidityEndDate in the Payload the value from the ValidityEndDate will be used.

Message Data Type

The message data type FundsManagementAccountSimpleByElementsResponseMessage_sync is being derived from the message data type FundsManagementAccountMessage_sync.

Package FundsManagementAccount

FundsManagementAccount

The entity FundsManagementAccount contains attributes of FundsManagementAccount. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount. Name is the name of the FundsManagementAccount. Description is the description of the FundsManagementAccount.

Message Data Type

The message data type FundsManagementAccountByIDQueryMessage_sync contains the Selection included in the business document. It contains the Selection package.

Selection Package

Selection contains the FundsManagementAccountSelectionByID entity.

FundsManagementAccountSelectionByID

The FundsManagementAccountSelectionByID specifies key of a FundsManagementAccount for selection of a FundsManagementAccount. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount.

Message Data Type

The message data type FundsManagementAccountByIDResponseMessage_sync is being derived from the message data type FundsManagementAccountMessage_sync.

FundsManagementAccount Package

FundsManagementAccount

The entity FundsManagementAccount contains attributes of FundsManagementAccount. FundsManagementAreaID is a unique identifier of Funds Management Area. FiscalYearValue is the numerical value that designates the fiscal year for which the FundsManagementAccount is valid. In case of year independent FundsManagementAccount the value of FiscalYearID is '0000'. FundsManagementAccountID is a unique identifier of the FundsManagementAccount. FundsManagementAccountID is a unique identifier of the SuperiorFundsManagementAccount in the hierarchy of FundsManagementAccounts. FundsManagementAccountCategoryCode is a coded representation of a FundsManagementAccountCategory. AuthorisationGroupCode is a coded representation of an authorisation group. Validity period is a validity period of the funds management account.

PostingAllowedIndicator indicates whether it is allowed to post on the FundsManagementAccount or not. StatisticalPurposeIndicator indicates whether the FundsManagementAccount is only used for statistical purpose. Such FundsManagementAccount cannot be budgeted. FundsManagementAccountBalanceCarryForwardDestination is used to cumulate the balances of the actual values of previous year's Funds Management Accounts to one or several Funds Management Accounts in the following year. FutureCashEffectivenessFiscalYearBudgetingAllowedIndicator indicates whether it is allowed to enter budget on the FundsManagementAccount for the CashEffectivenessFiscalYear greater than current FiscalYear. Name is the name of the FundsManagementAccount. Description is the description of the FundsManagementAccount.

GoodsMovement Interfaces

Goods in company can be receipt, consumed, produced, moved—physically as well as logically—and issued, with or without references to other business processes like e.g. purchasing and production. These different types of goods movements have to be posted in the company's inventory management, so that the company's inventory, the stock-accounts of the financial accounting and the cost accounting are normally up to date and correct.

Message Choreography

The message choreography of FIG. 189 describes a possible logical sequence of messages that can be used to realize a goods movement scenario.

A GoodsMovementWithReferenceCreateRequest_sync is a request to the Inventory Management to create a GoodsMovement with a reference to a preceding document. The structure of the message type GoodsMovementWithReferenceCreateRequest_sync is specified by the message data type GoodsMovementWithReferenceCreateRequestMessage_sync.

A GoodsMovementWithReferenceCreateConfirmation_sync is a confirmation sent from the Inventory Management concerning the request to create a GoodsMovement with a reference to a preceding document. The structure of the message type GoodsMovementWithReferenceCreateConfirmation_sync is specified by the message data type GoodsMovementWithReferenceCreateConfirmationMessage_sync.

A GoodsMovementCreateRequest_sync is a request to the Inventory Management to create a GoodsMovement. The structure of the message type GoodsMovementCreateRequest_sync is specified by the message data type GoodsMovementCreateRequestMessage_sync.

A GoodsMovementCreateConfirmation_sync is a confirmation sent from Inventory Management concerning the request to create a GoodsMovement. The structure of the message type GoodsMovementConfirmation_sync is specified by the message data type GoodsMovementCreateConfirmationMessage_sync.

A GoodsMovementCancelRequest_sync is a request to the Inventory Management to cancel a GoodsMovement completely or partially. The structure of the message type GoodsMovementCancelRequest_sync is specified by the message data type GoodsMovementCancelRequestMessage_sync.

A GoodsMovementCancelConfirmation_sync is a confirmation sent from the Inventory Management concerning the request to cancel a GoodsMovement. The structure of the message type GoodsMovementCancelConfirmation_sync is specified by the message data type GoodsMovementCancelConfirmationMessage_sync.

For example, a "Warehouse Clerk" system 189002 can request to create the goods movement using the GoodsMovementWithReferenceCreateRequest message 189006 as shown, for example, in FIG. 195. An "Inventory Management" system 189004 can confirm the creation request using the GoodsMovementWithReferenceCreateConfirmation message 189008 as shown, for example, in FIG. 194. The "Warehouse Clerk" system 189002 can send a GoodsMovementCreateRequest_sync message 189010 as shown, for example, in FIG. 193. The "Inventory Management" system 189004 can respond using the GoodsMovementCreateConfirmation_sync message 189012 as shown, for example, in FIG. 192. The "Warehouse Clerk" system 189002 can cancel a goods movement with a GoodsMovementCancelRequest_sync message 189014 as shown, for example, in FIG. 191. The "Inventory Management" system 189004 can respond using the GoodsMovementCancelConfirmation_sync message 189016 as shown, for example, in FIG. 190.

Message Data Type

The GoodsMovementWithReferenceCreateRequestMessage_sync contains the GoodsMovement included in the business document. FIG. 201 shows a GoodsMovementWithReferenceCreateRequestMessage 201000 package. The GoodsMovementWithReferenceCreateRequestMessage 201000 package is a GoodsMovementWithReferenceCreateRequestMessage 201004 datatype. The GoodsMovementWithReferenceCreateRequestMessage 201000 package includes a GoodsMovementWithReferenceCreateRequestMessage 201002 entity. The GoodsMovementWithReferenceCreateRequestMessage 201000 package includes a GoodsMovement 201006 package.

The GoodsMovement 201006 Package Includes a GoodsMovement 201008 Entity.

The GoodsMovement 201008 entity has a cardinality of one 201010 meaning that for each instance of the GoodsMovementWithReferenceCreateRequestMessage 201002 entity there is one GoodsMovement 201008 entity. The GoodsMovement 201008 entity includes various attributes, namely BaseBusinessTransactionDocumentID 201012 and BaseBusinessTransactionDocumentTypeCode 201018.

The BaseBusinessTransactionDocumentID 201012 attribute is a BusinessTransactionDocumentID 201016 datatype. The BaseBusinessTransactionDocumentID 201012 attribute has a cardinality of one 201014 meaning that for each instance of the GoodsMovement 201008 entity there is one BaseBusinessTransactionDocumentID 201012 attribute.

The BaseBusinessTransactionDocumentTypeCode 201018 attribute is a BusinessTransactionDocumentTypeCode 201022 datatype. The BaseBusinessTransactionDocumentTypeCode 201018 attribute has a cardinality of one 201020 meaning that for each instance of the GoodsMovement 201008 entity there is one BaseBusinessTransactionDocumentTypeCode 201018 attribute.

GoodsMovement Package

A GoodsMovement package groups together the GoodsMovement. It contains the entity GoodsMovement.

GoodsMovement

A GoodsMovement is a transaction resulting in a change in stock. It can be processed by using a reference to a preceding document (e.g. purchase order or delivery). The information of the preceding document is used to create a GoodsMovement. The BaseBusinessTransactionDocumentID is a unique identifier for a document in a business transaction. The BusinessTransactionDocumentTypeCode is a coded representation of the type of a document that occurs in business transactions. The document type describes the (business) nature of similar documents and defines the basic features of the documents of this type. One GoodsMovement can affect different materials in different inventories. The values S102 (InboundDelivery), S43 (OutboundDelivery) and S101 (CustomerReturnsDelivery) can be allowed for BaseBusinessTransactionDocumentTypeCode in the entity GoodsMovement.

Message Data Type

The message data type GoodsMovementWithReferenceCreateConfirmationMessage_sync contains the GoodsMovement included in the business document and the information of the message log. FIG. 200 shows a GoodsMovementWithReferenceCreateConfirmation 200000 package. The GoodsMovementWithReferenceCreateConfirmation 200000 package is a GoodsMovementWithReferenceCreateConfirmationMessage 200004 datatype. The GoodsMovementWithReferenceCreateConfirmation 200000 package includes a GoodsMovementWithReferenceCreateConfirmation 200002 entity. The GoodsMovementWithReferenceCreateConfirmation 200000 package includes various packages, namely GoodsMovement 200006 and Log 200018.

The GoodsMovement 200006 package includes a GoodsMovement 200008 entity.

The GoodsMovement 200008 entity has a cardinality of zero or one 200010 meaning that for each instance of the GoodsMovementWithReferenceCreateConfirmation 200002 entity there may be one GoodsMovement 200008 entity. The GoodsMovement 200008 entity includes a GoodsMovementID 200012 attribute.

The GoodsMovementID 200012 attribute is a GoodsMovementID 200016 datatype. The GoodsMovementID 200012 attribute has a cardinality of one 200014 meaning that for each instance of the GoodsMovement 200008 entity there is one GoodsMovementID 200012 attribute.

The Log 200018 package is a Log 200024 datatype. The Log 200018 package includes a Log 200020 entity.

The Log 200020 entity has a cardinality of one 200022 meaning that for each instance of the GoodsMovementWithReferenceCreateConfirmation 200002 entity there is one Log 200020 entity.

GoodsMovement Package

A GoodsMovement package groups together the GoodsMovement.

GoodsMovement

A GoodsMovement is a transaction resulting in a change in stock. One GoodsMovement can affect different materials in different inventories Log Package A Log package groups the messages used for user interaction.

Log

A log is a sequence of messages that result when an application executes a task.

Message Data Type

The message data type GoodsMovementCreateRequestMessage_sync contains the GoodsMovement included in the business document. FIGS. 199-1 through 199-11 show a GoodsMovementCreateRequestMessage_sync 199000 package. The GoodsMovementCreateRequestMessage_sync 199000 package is a GoodsMovementCreateRequestMessage_sync 199004 datatype. The GoodsMovementCreateRequestMessage_sync 199000 package includes a GoodsMovementCreateRequestMessage_sync 199002 entity. The GoodsMovementCreateRequestMessage_sync 199000 package includes various packages, namely MessageHeader 199006 and GoodsMovement 199014.

The MessageHeader 199006 package is a BasicBusinessDocumentMessageHeader 199012 datatype. The MessageHeader 199006 package includes a MessageHeader 199008 entity.

The MessageHeader 199008 entity has a cardinality of zero or one 199010 meaning that for each instance of the GoodsMovementCreateRequestMessage_sync 199002 entity there may be one MessageHeader 199008 entity.

The GoodsMovement 199014 package includes a GoodsMovement 199016 entity. The GoodsMovement 199014 package includes an Item 199056 package.

The GoodsMovement 199016 entity has a cardinality of one 199018 meaning that for each instance of the GoodsMovementCreateRequestMessage_sync 199002 entity there is one GoodsMovement 199016 entity. The GoodsMovement 199016 entity includes various attributes, namely PostingDate 199020, DocumentCreationDate 199026, Description 199032, GoodsMovementCategoryCode 199038, ExternalGoodsMovementReferenceDocumentID 199044 and GoodsReceiptIssueSlipPrintTypeCode 199050.

The PostingDate 199020 attribute is a Date 199024 datatype. The PostingDate 199020 attribute has a cardinality of one 199022 meaning that for each instance of the GoodsMovement 199016 entity there is one PostingDate 199020 attribute.

The DocumentCreationDate 199026 attribute is a Date 199030 datatype. The DocumentCreationDate 199026 attribute has a cardinality of zero or one 199028 meaning that for each instance of the GoodsMovement 199016 entity there may be one DocumentCreationDate 199026 attribute.

The Description 199032 attribute is a SHORT_Description 199036 datatype. The Description 199032 attribute has a cardinality of zero or one 199034 meaning that for each instance of the GoodsMovement 199016 entity there may be one Description 199032 attribute.

The GoodsMovementCategoryCode 199038 attribute is a GoodsMovementCategoryCode 199042 datatype. The GoodsMovementCategoryCode 199038 attribute has a cardinality of one 199040 meaning that for each instance of the GoodsMovement 199016 entity there is one GoodsMovementCategoryCode 199038 attribute.

The ExternalGoodsMovementReferenceDocumentID 199044 attribute is a GoodsMovementReferenceDocumentID 199048 datatype. The ExternalGoodsMovementReferenceDocumentID 199044 attribute has a cardinality of zero or one 199046 meaning that for each instance of the GoodsMovement 199016 entity there may be one ExternalGoodsMovementReferenceDocumentID 199044 attribute.

The GoodsReceiptIssueSlipPrintTypeCode 199050 attribute is a GoodsReceiptIssueSlipPrintTypeCode 199054 datatype. The GoodsReceiptIssueSlipPrintTypeCode 199050 attribute has a cardinality of zero or one 199052 meaning that for each instance of the GoodsMovement 199016 entity there may be one GoodsReceiptIssueSlipPrintTypeCode 199050 attribute.

The Item 199056 package includes an Item 199058 entity. The Item 199056 package includes various packages, namely Party 1990128, Location 1990150, Product 1990162, Quantity 1990220 and AccountAssignment 1990232.

The Item 199058 entity has a cardinality of one or n 199060 meaning that for each instance of the GoodsMovement 199016 entity there are one or more Item 199058 entities. The Item 199058 entity includes various attributes, namely GoodsMovementTypeCode 199062, InventoryUsabilityCode 199068, InventorySpecialStockTypeCode 199074, GoodsMovementReasonCode 199080, UnloadingPointName 199086, GoodsRecipientName 199092, PlantID 199098, Description 1990104, SalesOrderID 1990110, SalesOrderItemID 1990116 and ProjectWorkBreakdownStructureElementID 1990122.

The GoodsMovementTypeCode 199062 attribute is a GoodsMovementTypeCode 199066 datatype. The GoodsMovementTypeCode 199062 attribute has a cardinality of one 199064 meaning that for each instance of the Item 199058 entity there is one GoodsMovementTypeCode 199062 attribute.

The InventoryUsabilityCode 199068 attribute is an InventoryUsabilityCode 199072 datatype. The InventoryUsabilityCode 199068 attribute has a cardinality of zero or one 199070 meaning that for each instance of the Item 199058 entity there may be one InventoryUsabilityCode 199068 attribute.

The InventorySpecialStockTypeCode 199074 attribute is an InventorySpecialStockTypeCode 199078 datatype. The InventorySpecialStockTypeCode 199074 attribute has a cardinality of zero or one 199076 meaning that for each instance of the Item 199058 entity there may be one InventorySpecialStockTypeCode 199074 attribute.

The GoodsMovementReasonCode 199080 attribute is a GoodsMovementReasonCode 199084 datatype. The GoodsMovementReasonCode 199080 attribute has a cardinality of zero or one 199082 meaning that for each instance of the Item 199058 entity there may be one GoodsMovementReasonCode 199080 attribute.

The UnloadingPointName 199086 attribute is an UnloadingPointName 199090 datatype. The UnloadingPointName 199086 attribute has a cardinality of zero or one 199088 meaning that for each instance of the Item 199058 entity there may be one UnloadingPointName 199086 attribute.

The GoodsRecipientName 199092 attribute is a GoodsRecipientName 199096 datatype. The GoodsRecipientName 199092 attribute has a cardinality of zero or one 199094 meaning that for each instance of the Item 199058 entity there may be one GoodsRecipientName 199092 attribute.

The PlantID 199098 attribute is a PlantID 1990102 datatype. The PlantID 199098 attribute has a cardinality of one 1990100 meaning that for each instance of the Item 199058 entity there is one PlantID 199098 attribute.

The Description 1990104 attribute is a MEDIUM_Description 1990108 datatype. The Description 1990104 attribute has a cardinality of zero or one 1990106 meaning that for each instance of the Item 199058 entity there may be one Description 1990104 attribute.

The SalesOrderID 1990110 attribute is a SalesOrderID 1990114 datatype. The SalesOrderID 1990110 attribute has a cardinality of zero or one 1990112 meaning that for each instance of the Item 199058 entity there may be one SalesOrderID 1990110 attribute.

The SalesOrderItemID 1990116 attribute is a SalesOrderItemID 1990120 datatype. The SalesOrderItemID 1990116 attribute has a cardinality of zero or one 1990118 meaning that for each instance of the Item 199058 entity there may be one. SalesOrderItemID 1990116 attribute.

The ProjectWorkBreakdownStructureElementID 1990122 attribute is a ProjectWorkBreakdownStructureElementID 1990126 datatype. The ProjectWorkBreakdownStructureElementID 1990122 attribute has a cardinality of zero or one 1990124 meaning that for each instance of the Item 199058 entity there may be one ProjectWorkBreakdownStructureElementID 1990122 attribute.

The Party 1990128 package includes various entities, namely ProductRecipientParty 1990130 and SellerParty 1990140.

The ProductRecipientParty 1990130 entity has a cardinality of zero or one 1990132 meaning that for each instance of the Item 199058 entity there may be one ProductRecipientParty 1990130 entity. The ProductRecipientParty 1990130 entity includes an InternalID 1990134 attribute.

The InternalID 1990134 attribute is a PartyInternalID 1990138 datatype. The InternalID 1990134 attribute has a cardinality of one 1990136 meaning that for each instance of the ProductRecipientParty 1990130 entity there is one InternalID 1990134 attribute.

The SellerParty 1990140 entity has a cardinality of zero or one 1990142 meaning that for each instance of the Item 199058 entity there may be one SellerParty 1990140 entity. The SellerParty 1990140 entity includes an InternalID 1990144 attribute.

The InternalID 1990144 attribute is a PartyInternalID 1990148 datatype. The InternalID 1990144 attribute has a cardinality of one 1990146 meaning that for each instance of the SellerParty 1990140 entity there is one InternalID 1990144 attribute.

The Location 1990150 package includes an InventoryManagedLocation 1990152 entity.

The InventoryManagedLocation 1990152 entity has a cardinality of zero or one 1990154 meaning that for each instance of the Item 199058 entity there may be one InventoryManagedLocation 1990152 entity. The InventoryManagedLocation 1990152 entity includes an InternalID 1990156 attribute.

The InternalID 1990156 attribute is a LocationInternalID 1990160 datatype. The InternalID 1990156 attribute has a cardinality of one 1990158 meaning that for each instance of the InventoryManagedLocation 1990152 entity there is one InternalID 1990156 attribute.

The Product 1990162 package includes various entities, namely Material 1990164 and SerialNumber 1990210.

The Material 1990164 entity has a cardinality of one 1990166 meaning that for each instance of the Item 199058 entity there is one Material 1990164 entity. The Material 1990164 entity includes various attributes, namely InternalID 1990168, StandardID 1990174, BatchID 1990180, VendorBatchID 1990186, ExpirationDate 1990192, ProductionDate 1990198 and SerialIDCreateAutomaticIndicator 1990204.

The InternalID 1990168 attribute is a ProductInternalID 1990172 datatype. The InternalID 1990168 attribute has a cardinality of one 1990170 meaning that for each instance of the Material 1990164 entity there is one InternalID 1990168 attribute.

The StandardID 1990174 attribute is a ProductStandardID 1990178 datatype. The StandardID 1990174 attribute has a cardinality of zero or one 1990176 meaning that for each instance of the Material 1990164 entity there may be one StandardID 1990174 attribute.

The BatchID 1990180 attribute is a BatchID 1990184 datatype. The BatchID 1990180 attribute has a cardinality of zero or one 1990182 meaning that for each instance of the Material 1990164 entity there may be one BatchID 1990180 attribute.

The VendorBatchID 1990186 attribute is a BatchID 1990190 datatype. The VendorBatchID 1990186 attribute has a cardinality of zero or one 1990188 meaning that for each instance of the Material 1990164 entity there may be one VendorBatchID 1990186 attribute.

The ExpirationDate 1990192 attribute is a Date 1990196 datatype. The ExpirationDate 1990192 attribute has a cardinality of zero or one 1990194 meaning that for each instance of the Material 1990164 entity there may be one ExpirationDate 1990192 attribute.

The ProductionDate 1990198 attribute is a Date 1990202 datatype. The ProductionDate 1990198 attribute has a cardinality of zero or one 1990200 meaning that for each instance of the Material 1990164 entity there may be one ProductionDate 1990198 attribute.

The SerialIDCreateAutomaticIndicator 1990204 attribute is an Indicator 1990208 datatype. The SerialIDCreateAutomaticIndicator 1990204 attribute has a cardinality of zero or one 1990206 meaning that for each instance of the Material 1990164 entity there may be one SerialIDCreateAutomaticIndicator 1990204 attribute.

The SerialNumber 1990210 entity has a cardinality of zero or n 1990212 meaning that for each instance of the Item 199058 entity there may be one or more SerialNumber 1990210 entities. The SerialNumber 1990210 entity includes a SerialID 1990214 attribute.

The SerialID 1990214 attribute is a SerialID 1990218 datatype. The SerialID 1990214 attribute has a cardinality of one 1990216 meaning that for each instance of the SerialNumber 1990210 entity there is one SerialID 1990214 attribute.

The Quantity 1990220 package includes a Quantity 1990222 entity.

The Quantity 1990222 entity has a cardinality of one 1990224 meaning that for each instance of the Item 199058 entity there is one Quantity 1990222 entity. The Quantity 1990222 entity includes an EntryQuantity 1990226 attribute.

The EntryQuantity 1990226 attribute is a Quantity 1990230 datatype. The EntryQuantity 1990226 attribute has a cardinality of one 1990228 meaning that for each instance of the Quantity 1990222 entity there is one EntryQuantity 1990226 attribute.

The AccountAssignment 1990232 package includes an AccountAssignment 1990234 entity.

The AccountAssignment 1990234 entity has a cardinality of zero or one 1990236 meaning that for each instance of the Item 199058 entity there may be one AccountAssignment 1990234 entity. The AccountAssignment 1990234 entity includes various attributes, namely CostCentreID 1990238, GeneralLedgerAccountID 1990244, ProductionOrderID 1990250, MaintenanceOrderID 1990256, SalesOrderID 1990262, SalesOrderItemID 1990268, SalesOrderItemScheduleLineID 1990274, ProfitCentreID 1990280, ProjectWorkBreakdownStructureElementID 1990286, MasterFixedAssetID 1990292, FixedAssetID 1990298, FundsManagementFundID 1990304, FundsManagementCentreID 1990310, FundsManagementAccountID 1990316, CostingActivityID 1990322, ResourceClassID 1990328, GrantID 1990334, TradingPartnerAccountingBusinessAreaCode 1990340, ClearingCompanyID 1990346, ProjectNetworkID 1990352 and ProjectActivityID 1990358.

The CostCentreID 1990238 attribute is a CostCentreID 1990242 datatype. The CostCentreID 1990238 attribute has a cardinality of zero or one 1990240 meaning that for each instance of the AccountAssignment 1990234 entity there may be one CostCentreID 1990238 attribute.

The GeneralLedgerAccountID 1990244 attribute is a GeneralLedgerAccountID 1990248 datatype. The GeneralLedgerAccountID 1990244 attribute has a cardinality of zero or one 1990246 meaning that for each instance of the AccountAssignment 1990234 entity there may be one GeneralLedgerAccountID 1990244 attribute.

The ProductionOrderID 1990250 attribute is a ProductionOrderID 1990254 datatype. The ProductionOrderID 1990250 attribute has a cardinality of zero or one 1990252 meaning that for each instance of the AccountAssignment 1990234 entity there may be one ProductionOrderID 1990250 attribute.

The MaintenanceOrderID 1990256 attribute is a MaintenanceOrderID 1990260 datatype. The MaintenanceOrderID 1990256 attribute has a cardinality of zero or one 1990258 meaning that for each instance of the AccountAssignment 1990234 entity there may be one MaintenanceOrderID 1990256 attribute.

The SalesOrderID 1990262 attribute is a SalesOrderID 1990266 datatype. The SalesOrderID 1990262 attribute has a cardinality of zero or one 1990264 meaning that for each instance of the AccountAssignment 1990234 entity there may be one SalesOrderID 1990262 attribute.

The SalesOrderItemID 1990268 attribute is a SalesOrderItemID 1990272 datatype. The SalesOrderItemID 1990268 attribute has a cardinality of zero or one 1990270 meaning that for each instance of the AccountAssignment 1990234 entity there may be one SalesOrderItemID 1990268 attribute.

The SalesOrderItemScheduleLineID 1990274 attribute is a BusinessTransactionDocumentItemScheduleLineID 1990278 datatype. The SalesOrderItemScheduleLineID 1990274 attribute has a cardinality of zero or one 1990276 meaning that for each instance of the AccountAssignment 1990234 entity there may be one SalesOrderItemScheduleLineID 1990274 attribute.

The ProfitCentreID 1990280 attribute is a ProfitCentreID 1990284 datatype. The ProfitCentreID 1990280 attribute has a cardinality of zero or one 1990282 meaning that for each instance of the AccountAssignment 1990234 entity there may be one ProfitCentreID 1990280 attribute.

The ProjectWorkBreakdownStructureElementID 1990286 attribute is a ProjectWorkBreakdownStructureElementID 1990290 datatype. The ProjectWorkBreakdownStructureElementID 1990286 attribute has a cardinality of zero or one 1990288 meaning that for each instance of the AccountAssignment 1990234 entity there may be one ProjectWorkBreakdownStructureElementID 1990286 attribute.

The MasterFixedAssetID 1990292 attribute is a MasterFixedAssetID 1990296 datatype. The MasterFixedAssetID 1990292 attribute has a cardinality of zero or one 1990294 meaning that for each instance of the AccountAssignment 1990234 entity there may be one MasterFixedAssetID 1990292 attribute.

The FixedAssetID 1990298 attribute is a FixedAssetID 1990302 datatype. The FixedAssetID 1990298 attribute has a cardinality of zero or one 1990300 meaning that for each instance of the AccountAssignment 1990234 entity there may be one FixedAssetID 1990298 attribute.

The FundsManagementFundID 1990304 attribute is a FundsManagementFundID 1990308 datatype. The FundsManagementFundID 1990304 attribute has a cardinality of zero or one 1990306 meaning that for each instance of the AccountAssignment 1990234 entity there may be one FundsManagementFundID 1990304 attribute.

The FundsManagementCentreID 1990310 attribute is a FundsManagementCentreID 1990314 datatype. The FundsManagementCentreID 1990310 attribute has a cardinality of zero or one 1990312 meaning that for each instance of the AccountAssignment 1990234 entity there may be one FundsManagementCentreID 1990310 attribute.

The FundsManagementAccountID 1990316 attribute is a FundsManagementAccountID 1990320 datatype. The FundsManagementAccountID 1990316 attribute has a cardinality of zero or one 1990318 meaning that for each instance of the AccountAssignment 1990234 entity there may be one FundsManagementAccountID 1990316 attribute.

The CostingActivityID 1990322 attribute is a CostingActivityID 1990326 datatype. The CostingActivityID 1990322 attribute has a cardinality of zero or one 1990324 meaning that for each instance of the AccountAssignment 1990234 entity there may be one CostingActivityID 1990322 attribute.

The ResourceClassID 1990328 attribute is a ResourceClassID 1990332 datatype. The ResourceClassID 1990328 attribute has a cardinality of zero or one 1990330 meaning that for each instance of the AccountAssignment 1990234 entity there may be one ResourceClassID 1990328 attribute.

The GrantID 1990334 attribute is a GrantID 1990338 datatype. The GrantID 1990334 attribute has a cardinality of zero or one 1990336 meaning that for each instance of the AccountAssignment 1990234 entity there may be one GrantID 1990334 attribute.

The TradingPartnerAccountingBusinessAreaCode 1990340 attribute is an AccountingBusinessAreaCode 1990344 datatype. The TradingPartnerAccountingBusinessAreaCode 1990340 attribute has a cardinality of zero or one 1990342 meaning that for each instance of the AccountAssignment 1990234 entity there may be one TradingPartnerAccountingBusinessAreaCode 1990340 attribute.

The ClearingCompanyID 1990346 attribute is a CompanyID 1990350 datatype. The ClearingCompanyID 1990346 attribute has a cardinality of zero or one 1990348 meaning that for each instance of the AccountAssignment 1990234 entity there may be one ClearingCompanyID 1990346 attribute.

The ProjectNetworkID 1990352 attribute is a ProjectNetworkID 1990356 datatype. The ProjectNetworkID 1990352 attribute has a cardinality of zero or one 1990354 meaning that for each instance of the AccountAssignment 1990234 entity there may be one ProjectNetworkID 1990352 attribute.

The ProjectActivityID 1990358 attribute is a ProjectActivityID 1990362 datatype. The ProjectActivityID 1990358 attribute has a cardinality of zero or one 1990360 meaning that for each instance of the AccountAssignment 1990234 entity there may be one ProjectActivityID 1990358 attribute.

MessageHeader Package

A MessageHeader package groups together the business information that is relevant for sending a business document in a message.

MessageHeader

A MessageHeader comprises business information from the perspective of the sender application for identifying and processing of a business document (instance) within a (technical) message (if applicable, with a reference to a previous instance of a business document within a previous (technical) message).

GoodsMovement Package

A GoodsMovement package groups the GoodsMovement.

GoodsMovement

A GoodsMovement is a transaction resulting in a change in stock. PostingDate is a date at which an accounting document in Financial Accounting becomes effective and the period balances of the concerned accounts change. The posting date specifies in which financial period a goods movement is posted. DocumentCreationDate is a date at which an original document was created. Description contains explanations or notes which apply to the goods movement as a whole. GoodsMovementCategoryCode is a coded representation of a category of a goods movement. ExternalGoodsMovementReferenceDocumentID is an identifier for an external goods movement reference document. A GoodsReceiptIssueSlipPrintTypeCode is a coded representation of a type of a goods receipt/issue slip which shall be printed out. Goods issues are allowed (GoodsMovementCategoryCode 3). The description of a goods movement can be restricted to 25 characters. Goods receipt/issue slips can be printed if a GoodsReceiptIssueSlipPrintTypeCode is provided and the user has the necessary authorisation.

Item Package

The Item Package groups the item with its packages.

Item

A goods movement item documents an inventory change within a goods movement. GoodsMovementTypeCode is the coded representation of a goods movement type for a goods movement. InventoryUsabilityCode is a coded representation of the usability of a warehouse inventory for company-specific business processes. InventorySpecialStockTypeCode is the coded representation of an inventory special stock type. GoodsMovementReasonCode is the coded representation of the reason for a goods movement. UnloadingPointName is a name of an unloading point. GoodsRecipientName is the name of the recipient of a material. PlantID is an identifier of a plant. This is the plant in which the goods movement item is initiated. Description contains an explanatory text on the goods movement item. SalesOrderID is the unique identifier of a SalesOrder. A goods movement item can be assigned to a SalesOrder if it concerns sales order stock. SalesOrderItemID is the unique identifier for an item in the SalesOrder. A goods movement item can be assigned to a SalesOrderItem if it concerns sales order stock. ProjectWorkBreakdownStructureElementID is an identifier for a Project Work Breakdown Structure Element.

A goods movement item can be assigned to a ProjectWorkBreakDownStructureElement if it concerns project stock. A GoodsMovementTypeCode can be used in combination with a GoodsMovementCategoryCode. GoodsMovementTypeCodes for goods issues can be allowed. SalesOrderID and SalesOrderItem ID can be used if a goods movement shall be posted to sales order stock (InventorySpecialStockTypeCode 1). ProjectWorkBreakdownStructureElementID can be used if a goods movement shall be posted to project stock (InventorySpecialStockTypeCode 2). The description of a goods movement item is restricted to 50 characters.

For consumption for cost center (GoodsMovementTypeCode 201), goods can be withdrawn from unrestricted use stock. With this goods movement type goods withdrawal from vendor consignment stock (InventorySpecialStockTypeCode 3) and from pipeline material (InventorySpecialStockTypeCode 4) are possible.

For consumption for project (GoodsMovementTypeCode 221), goods can be withdrawn from unrestricted use stock. With this goods movement type goods withdrawal from project stock (InventorySpecialStockTypeCode 2 and from vendor consignment stock (InventorySpecialStockTypeCode 3) are possible.

For consumption for sales order (GoodsMovementTypeCode 231), goods can be withdrawn from unrestricted use stock. With this goods movement type goods withdrawal from sales order stock (InventorySpecialStockTypeCode 1), project stock (InventorySpecialStockTypeCode 2) and from vendor consignment stock (InventorySpecialStockTypeCode 3) are possible.

For consumption for asset (GoodsMovementTypeCode 241), goods can be withdrawn from unrestricted use stock. With this goods movement type goods withdrawal from vendor consignment stock (InventorySpecialStockTypeCode 3) is possible.

For consumption for sales (GoodsMovementTypeCode 251), goods can be withdrawn from unrestricted use stock. With this goods movement type goods withdrawal from vendor consignment stock (InventorySpecialStockTypeCode 3) is possible.

For consumption for maintenance order or production order (GoodsMovementTypeCode 261), goods can be withdrawn from unrestricted use stock. With this goods movement type goods withdrawal from sales order stock (InventorySpecialStockTypeCode 1), project stock (InventorySpecialStockTypeCode 2), vendor consignment stock (InventorySpecialStockTypeCode 3), pipeline material (InventorySpecialStockTypeCode 4) and from customer consignment stock (InventorySpecialStockTypeCode 5) are possible.

For consumption for project network (GoodsMovementTypeCode 281) or for consumption for all account assignments from warehouse (GoodsMovementTypeCode 291), goods can be withdrawn from unrestricted use stock. With this goods movement type goods withdrawal from sales order stock (InventorySpecialStockTypeCode 1), project stock (InventorySpecialStockTypeCode 2), vendor consignment stock (InventorySpecialStockTypeCode 3) and from pipeline material (InventorySpecialStockTypeCode 4) are possible.

For withdrawal for scrapping from unrestricted use stock (GoodsMovementTypeCode 551), goods can be withdrawn from unrestricted use stock. With this goods movement type goods withdrawal from sales order stock (InventorySpecialStockTypeCode 1), project stock (InventorySpecialStockTypeCode 2), vendor consignment stock (InventorySpecialStockTypeCode 3), customer consignment stock (InventorySpecialStockTypeCode 5), returnable packing stock at customer (InventorySpecialStockTypeCode 7) and from stock of material provided to vendor (InventorySpecialStockTypeCode 8) are possible.

For withdrawal for scrapping from quality inspection stock (GoodsMovementTypeCode 553), goods can be withdrawn from stock in quality inspection. With this goods movement type goods withdrawal from sales order stock (InventorySpecialStockTypeCode 1), project stock (InventorySpecialStockTypeCode 2), vendor consignment stock (InventorySpecialStockTypeCode 3), customer consignment stock (InventorySpecialStockTypeCode 5), returnable packing stock at customer (InventorySpecialStockTypeCode 7) and from stock of material provided to vendor (InventorySpecialStockTypeCode 8) are possible.

For withdrawal for scrapping from blocked stock (GoodsMovementTypeCode 555), goods can be withdrawn from blocked. With this goods movement type goods withdrawal from sales order stock (InventorySpecialStockTypeCode 1), project stock (InventorySpecialStockTypeCode 2) and vendor consignment stock (InventorySpecialStockTypeCode 3) are possible.

Party Package

A party package groups party information required for a goods movement item.

ProductRecipientParty

A ProductRecipientParty is a party to which goods are delivered or for whom services are provided. InternalID is a unique identifier for a party. A ProductRecipientParty is required if a goods movement shall be posted to customer consignment stock (InventorySpecialStockTypeCode 5) or to returnable packing stock at customer (InventorySpecialStockTypeCode 7).

SellerParty

A SellerParty is a party that sells goods or services. InternalID is a unique identifier for a party. A SellerParty is required if a goods movement shall be posted concerning vendor consignment stock (InventorySpecialStockTypeCode 3), returnable transport packing (vendor) (InventorySpecialStockTypeCode 6) or to stock of material provided to vendor (InventorySpecialStockTypeCode 8). For pipeline-material (InventorySpecialStockTypeCode 4) a SellerParty will be determined automatically but can also provided manually.

Location Package

A Location package groups location information required for a goods movement item.

InventoryManagedLocation

InventoryManagedLocation is a physical place, which is relevant for the execution of the goods movement process. InternalID is a proprietary identifier for a location. An InventoryManagedLocation can be unique in combination with a PlantID. InventoryManagedLocation are generally not provided for goods movements which shall be posted to customer consignment stock (InventorySpecialStockTypeCode 5), returnable packing stock at customer (InventorySpecialStockTypeCode 7) and to stock of material provided to vendor (InventorySpecialStockTypeCode 8).

Product Package

The Product package groups material information of the goods movement item.

Material

A Material is a specific good which shall be moved by a goods movement. InternalID is a proprietary identifier for a material. StandardID is a standardized identifier for a product, and the identification scheme is managed by an agency from the code list DE 3055. BatchID is an identifier for a batch of a material. VendorBatchID is an identifier for a batch of a material provided by the vendor. ExpirationDate is a date at which a material expires. ProductionDate is a date at which a material was produced. SerialIDCreateAutomaticIndicator indicates that the system shall automatically create the required SerialID(s). A BatchID can be unique in combination with a ProductInternalID. ShemeAgencyID 9 (EAN) is allowed for ProductStandardID. In combination with GoodsMovementCode 3, the SerialNumberAutomaticalCreationIndicator can be used, if the material is not yet serialized and the serialization shall be done during the goods movement process. If a material is batch managed, a BatchID is required. VendorBatchID, ExpirationDate and ProductionDate are optional.

SerialNumber

A SerialNumber is a number which can be assigned to a physical material. The SerialNumber is used to distinguish a specific material from all the other materials with the same material-ID. The combination SerialNumber and material-ID can be unique. A SerialID (serial number) is a unique identifier for an individual item that is assigned in the context of production. If SerialIDCreateAutomaticIndicator is set, no SerialIDs need be provided.

Quantity Package

A Quantity package groups the quantities in which an item can be managed.

Quantity

Quantity is the quantity of an item. An item can be managed simultaneously in two, non-transposable units of measure. EntryQuantity is the quantity which specifies the actual quantity to be moved in the entry unit of measure. The entry quantity is allowed.

AccountAssignment Package

The AccountAssignment Package groups together all accounting information, including the accounting distribution and the accounting objects.

AccountAssignment

An AccountAssignment is a set of control data used to distribute the costs to accounting objects, when a goods movement item is posted. The costs comprise the value of the goods movement item.

CostCentreID is an identifier for a cost centre. Depending on the goods movement type, the cost centre is charged with the value of the goods movement item. GeneralLedgerAccountID is an identifier for a G/L account. Depending on the goods movement type, the G/L account is charged with the value of the goods movement item. ProductionOrderID is an identifier for a Production Order. Depending on the goods movement type, the production order is charged with the value of the goods movement item. MaintenanceOrderID is an identifier for a maintenance order. Depending on the goods movement type, the maintenance order is charged with the value of the goods movement item. SalesOrderID is the unique identifier of a SalesOrder. A sales order cannot be charged with the value of the good movement item directly. The sales order with one of its items or if applicable the schedule line of a sales order item of a sales order can be charged. SalesOrderItemID is the unique identifier for an item in the SalesOrder. Depending on the goods movement type, the sales order item of a sales order is charged with the value of the goods movement item. SalesOrderItemScheduleLineID is the unique identifier for a ScheduleLine in the SalesOrderItem. Depending on the goods movement type, the sales order item schedule line of a sales order item is charged with the value of the goods movement item. ProfitCentreID is an identifier for a profit center. Depending on the goods movement type, the profit centre is charged with the value of the goods movement item. ProjectWorkBreakdownStructureElementID is an identifier for a Project Work Breakdown Structure Element. Depending on the goods movement type, the project work breakdown structure element is charged with the value of the goods movement item. MasterFixedAssetID identifies a business unit within a company from one or several fixed assets that are depreciated individually, but it can be possible to represent their values together and maintain their data together. The first fixed asset has a special role. The master data is maintained in it. This data can be copied to additional corresponding fixed assets. To charge an asset, MasterFixedAssetID and FixedAssertID are required. FixedAssetID is an ID for a fixed asset in the fixed assets of a company (Company). Depending on the goods movement type, an asset is charged with the value of the goods movement item. To charge an asset, MasterFixedAssetID and FixedAssertID are required. FundsManagementFundID is a unique identifier for a Fund. Depending on the goods movement type, find is charged with the value of the goods movement item. FundsManagementCentreID is a unique identifier for a Funds Management Centre. Depending on the goods movement type, the funds management centre is charged with the value of the goods movement item. FundsManagementAccountID is a unique identifier for a Funds Management Account. Depending on the goods movement type, the funds management account is charged with the value of the goods movement item. CostingActivityID is an identifier for a costing activity. Depending on the goods movement type, costing activity is charged with the value of the goods movement item. ResourceClassID is an identifier for a resource class. A resource class classifies resources of a particular nature (e.g. development resources, consulting resources). Depending on the goods movement type, the resource class is charged with the value of the goods movement item. GrantID is a unique identifier for a Grant. Depending on the goods movement type, the grant is charged with the value of the goods movement item. TradingPartnerAccountingBusinessAreaCode is the coded representation of a business area of the trading partner within a company from the accounting point of view. Together with the business area to which the goods movement item is posted, there is a sender/receiver relationship in each goods movement item. This relationship enables the elimination of intercompany sales at business area level within business area consolidation. ClearingCompanyID is an identifier for a company which initiates the goods movement item posting. ProjectNetworkID is an identifier for a Project Network. A project network cannot be charged with the value of the good movement item directly. The project network with one of its project activities can be charged. ProjectActivityID is an identifier for a ProjectActivity. A ProjectActivityID is an ActivityID of a project network. Depending on the goods movement type, the project activity of project network is charged with the value of the goods movement item.

It depends on the goods movement type which account assignment object is charged with the value of the goods movement item. It also depends on the customizing of the goods movement types which account assignment objects are optional or not relevant. CostCentreID can be used if consumption for a cost center (GoodsMovementTypeCode 201) shall be posted. ProjectWorkBreakdownStructureElementID can be used if consumption for project (GoodsMovementTypeCode 221) shall be posted. SalesOrderID and SalesOrderItemID are used, SalesOrderItemScheduleLineID is optional if consumption for sales order (GoodsMovementTypeCode 231) shall be posted. MasterFixedAssedID is used, FixedAssedID is optional if consumption for asset (GoodsMovementTypeCode 241) shall be posted. MaintenanceOrderID or ProductionOrderID is used if consumption for maintenance order or production order (GoodsMovementTypeCode 261) shall be posted. ProjectNetworkID and ProjectActivityID are used if a consumption for project network (GoodsMovementTypeCode 281) shall be posted.

Message Data Type

The message data type GoodsMovementCreateConfirmationMessage_sync contains the GoodsMovement included in the business document and the information of the message log. FIG. 198 shows a GoodsMovementCreateConfirmationMessage_sync 198000 package. The GoodsMovementCreateConfirmationMessage_sync 198000 package is a GoodsMovementForDeliveryCreateConfirmationMessage 198004 datatype. The GoodsMovementCreateConfirmationMessage_sync 198000 package includes a GoodsMovementCreateConfirmation_sync 198002 entity. The GoodsMovementCreateConfirmationMessage__sync 198000 package includes various packages, namely MessageHeader 198006, GoodsMovement 198014 and Log 198032.

The MessageHeader 198006 package is a BasicBusinessDocumentMessageHeader 198012 datatype. The MessageHeader 198006 package includes a MessageHeader 198008 entity.

The MessageHeader 198008 entity has a cardinality of zero or one 198010 meaning that for each instance of the GoodsMovementCreateConfirmation_sync 198002 entity there may be one MessageHeader 198008 entity.

The GoodsMovement 198014 package includes a GoodsMovement 198016 entity.

The GoodsMovement 198016 entity has a cardinality of zero or one 198018 meaning that for each instance of the GoodsMovementCreateConfirmation_sync 198002 entity there may be one GoodsMovement 198016 entity. The GoodsMovement 198016 entity includes various attributes, namely ID 198020 and Year 198026.

The ID 198020 attribute is a GoodsMovementID 198024 datatype. The ID 198020 attribute has a cardinality of one 198022 meaning that for each instance of the GoodsMovement 198016 entity there is one ID 198020 attribute.

The Year 198026 attribute is a Year 198030 datatype. The Year 198026 attribute has a cardinality of one 198028 meaning that for each instance of the GoodsMovement 198016 entity there is one Year 198026 attribute.

The Log 198032 package is a Log 198038 datatype. The Log 198032 package includes a Log 198034 entity.

The Log 198034 entity has a cardinality of one 198036 meaning that for each instance of the GoodsMovementCreateConfirmation_sync 198002 entity there is one Log 198034 entity.

MessageHeader Package

A MessageHeader package groups together the business information that is relevant for sending a business document in a message.

MessageHeader

A MessageHeader comprises business information from the perspective of the sender application for identifying and processing of a business document (instance) within a (technical) message (if applicable, with a reference to a previous instance of a business document within a previous (technical) message).

GoodsMovement Package

A GoodsMovement package groups together the GoodsMovement.

GoodsMovement

A GoodsMovement is a transaction resulting in a change in stock. ID is the unique identifier for a GoodsMovement. A goods movement can be unique in combination with a year. Year specifies a year in the Gregorian calendar. A goods movement can be unique in combination with a year. One GoodsMovement can affect different materials in different inventories.

Log Package

A Log package groups the messages used for user interaction.

Log

A log is a sequence of messages that result when an application executes a task.

Message Data Type

The message data type GoodsMovementCancelRequestMessage_sync contains the GoodsMovement included in the business document. A GoodsMovement which has been posted with reference to an Inbound-, Outbound- or a CustomerReturnsDelivery cannot be canceled by GoodsMovementCancelRequestMessage_sync. A GoodsMovement can generally be cancelled once.

GoodsMovementCancelRequestMessage_sync does not change the posted document of the original goods movement. A new goods movement will be posted in order to carry out the cancellation. The items of the new goods movement refer to the canceled items of the original goods movement.

For canceling a goods movement completely, the GoodsMovementID and the Year can be used. If only particular goods movement items shall be canceled, additionally the corresponding GoodsMovementItemIDs can be used.

FIG. 197 shows a GoodsMovementCancelRequestMessage_sync 197000 package. The GoodsMovementCancelRequestMessage_sync 197000 package is a GoodsMovementCancelRequestMessage_sync 197004 datatype. The GoodsMovementCancelRequestMessage_sync 197000 package includes a GoodsMovementCancelRequest_sync 197002 entity. The GoodsMovementCancelRequestMessage_sync 197000 package includes various packages, namely MessageHeader 197006 and GoodsMovement 197014.

The MessageHeader 197006 package is a BasicBusinessDocumentMessageHeader 197012 datatype. The MessageHeader 197006 package includes a MessageHeader 197008 entity.

The MessageHeader 197008 entity has a cardinality of zero or one 197010 meaning that for each instance of the GoodsMovementCancelRequest_sync 197002 entity there may be one MessageHeader 197008 entity.

The GoodsMovement 197014 package includes a GoodsMovement 197016 entity.

The GoodsMovement 197016 entity has a cardinality of one 197018 meaning that for each instance of the GoodsMovementCancelRequest_sync 197002 entity there is one GoodsMovement 197016 entity. The GoodsMovement 197016 entity includes various attributes, namely ID 197020, Year 197026 and PostingDate 197032. The GoodsMovement 197016 entity includes an Item 197038 subordinate entity.

The ID 197020 attribute is a GoodsMovementID 197024 datatype. The ID 197020 attribute has a cardinality of one

197022 meaning that for each instance of the GoodsMovement 197016 entity there is one ID 197020 attribute.

The Year 197026 attribute is a Year 197030 datatype. The Year 197026 attribute has a cardinality of one 197028 meaning that for each instance of the GoodsMovement 197016 entity there is one Year 197026 attribute.

The PostingDate 197032 attribute is a Date 197036 datatype. The PostingDate 197032 attribute has a cardinality of zero or one 197034 meaning that for each instance of the GoodsMovement 197016 entity there may be one PostingDate 197032 attribute.

The Item 197038 entity has a cardinality of zero or n 197040 meaning that for each instance of the GoodsMovement 197016 entity there may be one or more Item 197038 entities. The Item 197038 entity includes an ID 197042 attribute.

The ID 197042 attribute is a GoodsMovementItemID 197046 datatype. The ID 197042 attribute has a cardinality of one 197044 meaning that for each instance of the Item 197038 entity there is one ID 197042 attribute.

MessageHeader Package

A MessageHeader package groups together the business information that is relevant for sending a business document in a message.

MessageHeader

A MessageHeader comprises business information from the perspective of the sender application for identifying and processing of a business document (instance) within a (technical) message (if applicable, with a reference to a previous instance of a business document within a previous (technical) message).

GoodsMovement Package

A GoodsMovement package groups the GoodsMovement.

GoodsMovement

A GoodsMovement is a transaction resulting in a change in stock. ID is the unique identifier for a GoodsMovement. A goods movement can be unique in combination with a year. Year specifies a year in the Gregorian calendar. PostingDate is a date at which an accounting document in Financial Accounting becomes effective and the period balances of the concerned accounts change. The posting date specifies in which financial period a goods movement is posted. An ID can be unique in combination with a year.

Item Package

The Item Package groups the item together.

Item

A goods movement Item documents an Inventory change within a goods movement. ID is the unique identifier for the GoodsMovementItem.

Message Data Type

The message data type GoodsMovementCancelConfirmationMessage_sync contains the GoodsMovement included in the business document and the information of the message log. FIG. 196 shows a GoodsMovementCancelConfirmationMessage_sync 196000 package. The GoodsMovementCancelConfirmationMessage_sync 196000 package is a GoodsMovementCancelConfirmationMessage_sync 196004 datatype. The GoodsMovementCancelConfirmationMessage_sync 196000 package includes a GoodsMovementCancelConfirmation_sync 196002 entity. The GoodsMovementCancelConfirmationMessage_sync 196000 package includes various packages, namely MessageHeader 196006, GoodsMovement 196014 and Log 196032.

The MessageHeader 196006 package is a BasicBusinessDocumentMessageHeader 196012 datatype. The MessageHeader 196006 package includes a MessageHeader 196008 entity.

The MessageHeader 196008 entity has a cardinality of zero to one 196010 meaning that for each instance of the GoodsMovementCancelConfirmation_sync 196002 entity there are zero or one MessageHeader 196008 entities.

The GoodsMovement 196014 package includes a GoodsMovement 196016 entity.

The GoodsMovement 196016 entity has a cardinality of zero or one 196018 meaning that for each instance of the GoodsMovementCancelConfirmation_sync 196002 entity there are zero or one GoodsMovement 196016 entities. The GoodsMovement 196016 entity includes various attributes, namely ID 196020 and Year 196026.

The ID 196020 attribute is a GoodsMovementID 196024 datatype. The ID 196020 attribute has a cardinality of one 196022 meaning that for each instance of the GoodsMovement 196016 entity there is one ID 196020 attribute.

The Year 196026 attribute is a Year 196030 datatype. The Year 196026 attribute has a cardinality of one 196028 meaning that for each instance of the GoodsMovement 196016 entity there is one Year 196026 attribute.

The Log 196032 package is a Log 196038 datatype. The Log 196032 package includes a Log 196034 entity.

The Log 196034 entity has a cardinality of one 196036 meaning that for each instance of the GoodsMovementCancelConfirmation_sync 196002 entity there is one Log 196034 entity.

InternalControlSignoff Interfaces

InternalControl

Within the Management of Internal Controls not only the documentation of all existing controls within one company is requested, but also to test and assess the completeness and correctness of those controls. At the end of the fiscal year the board is requested to sign off the correctness and completeness of the internal control system. This signoff can be performed via self service in an external system.

Message Choreography

The message choreography of FIG. 202 describes a possible logical sequence of messages that can be used to realize an internal control signoff business scenario.

An InternalControlSignoffByIDQuery is the inquiry to the Management of Internal Controls about the InternalControlSignoff for an organizational center. The structure of the message type InternalControlSignoffByID Query is specified by the message data type InternalControlSignoffByIDQueryMessage.

An InternalControlSignoffByIDResponse is the response to an InternalControlSignoffByIDQuery. The structure of the message type InternalControlSignoffByIDResponse is specified by the message data type InternalControlSignoffByIDResponseMessage.

A SubordinateInternalControlSignoffByInternalControlSignoffQuery is the inquiry to the Management of Internal Controls about the InternalControlSignoff for a subordinate organizational center. The structure of the message type SubordinateInternalControlSignoffByInternalControlSignoffQuery is specified by the message data type SubordinateInternalControlSignoffByInternalControlSignoffQueryMessage.

A SubordinateInternalControlSignoffByInternalControlSignoffResponse is the response to a SubordinateInternalControlSignoffByInternalControlSignoffQuery. The structure of the message type SubordinateInternalControlSignoffByInternalControlSignoffResponse is specified by the message data type SubordinateInternalControlSignoffByInternalControlSignoffResponseMessage.

An InternalControlSignoffPerformRequest is the request to the Management of Internal Controls to perform a signoff. The structure of the message type InternalControlSignoffPerformRequest is specified by the message data type InternalControlSignoffPerformRequestMessage.

An InternalControlSignoffPerformConfirmation is the confirmation to an InternalControlSignoffPerformRequest. The structure of the message type InternalControlSignoffPerformConfirmation is specified by the message data type InternalControlSignoffPerformConfirmationMessage.

An InternalControlSignoffAttachmentByIDQuery is the inquiry to the Management of Internal Controls about the internal control signoff attachment. The structure of the message type InternalControlSignoffAttachmentByIDQuery is specified by the message data type InternalControlSignoffAttachmentByIDQueryMessage.

An InternalControlSignoffAttachmentByIDResponse is the response to an InternalControlSignoffAttachmentByIDQuery. The structure of the message type InternalControlSignoffAttachmentByIDResponse is specified by the message data type InternalControlSignoffAttachmentByIDResponseMessage.

An InternalControlSignoffAttachmentCreateRequest is the request to the Management of Internal Control to create an internal control signoff attachment. The structure of the message type InternalControlSignoffAttachmentCreateRequest is specified by the message data type InternalControlSignoffAttachmentCreateRequestMessage.

An InternalControlSignoffAttachmentCreateConfirmation is the confirmation to an InternalControlSignoffAttachmentCreateRequest. The structure of the message type InternalControlSignoffAttachmentCreateConfirmation is specified by the message data type InternalControlSignoffAttachmentCreateConfirmationMessage.

An InternalControlSignoffAttachmentCancelRequest is the request to the Management of Internal Control to cancel an internal control signoff attachment. The structure of the message type InternalControlSignoffAttachmentCancelRequest is specified by the message data type InternalControlSignoffAttachmentCancelRequestMessage.

An InternalControlSignoffAttachmentCancelConfirmation is the confirmation to an InternalControlSignoffAttachmentCancelRequest. The structure of the message type InternalControlSignoffAttachmentCancelConfirmation is specified by the message data type InternalControlSignoffAttachmentCancelConfirmationMessage.

For example, a “Signoff Responsible” system 202002 can query an internal control signoff using the InternalControlSignoffByIDQuery message 202006 as shown, for example, in FIG. 209. A “Management of Internal Controls” system 202004 can respond to the query using the InternalControlSignoffByIDResponse message 202008 as shown, for example, in FIG. 210. The “Signoff Responsible” system 202002 can query an internal control signoff by internal control signoff using a SubordinateInternalControlSignoffByInternalControlSignoffQuery message 202010 as shown, for example, in FIG. 213. The “Management of Internal Controls” system 202004 can respond to the query using a SubordinateInternalControlSignoffByInternalControlSignoffResponse message 202012 as shown, for example, in FIG. 214. The “Signoff Responsible” system 202002 can request to perform an internal control signoff using the InternalControlSignoffPerformRequest message 202014 as shown, for example, in FIG. 212. The “Management of Internal Controls” system 202004 can confirm the request using the InternalControlSignoffPerformConfirmation message 202016 as shown, for example, in FIG. 211. The “Signoff Responsible” system 202002 can query an internal control signoff attachment by ID using the InternalControlSignoffAttachmentByIDQuery message 202018 as shown, for example, in FIG. 203. The “Management of Internal Controls” system 202004 can respond to the query using the InternalControlSignoffAttachmentByIDResponse message 202020 as shown, for example, in FIG. 204. The “Signoff Responsible” system 202002 can request to create an internal control signoff attachment using the InternalControlSignoffAttachmentCreateRequest message 202022 as shown, for example, in FIG. 208. The “Management of Internal Controls” system 202004 can confirm the request using the InternalControlSignoffAttachmentCreateConfirmation message 202024 as shown, for example, in FIG. 207. The “Signoff Responsible” system 202002 can request to cancel an internal control signoff attachment using the InternalControlSignoffAttachmentCancelRequest message 202026 as shown, for example, in FIG. 206. The “Management of Internal Controls” system 202004 can confirm the request using the InternalControlSignoffAttachmentCancelConfirmation message 202028 as shown, for example, in FIG. 205.

Message Data Type

The message data type InternalControlSignoffByIDQueryMessage_sync contains the Selection included in the business document and the business information that is relevant for sending a business document in a message. FIGS. 221-1 through 221-2 show an InternalControlSignoffbyIDQuery 221000 package. The InternalControlSignoffbyIDQuery 221000 package is an InternalControlSignoffbyIDQuery 221004 datatype. The InternalControlSignoffbyIDQuery 221000 package includes an InternalControlSignoffbyIDQuery 221002 entity. The InternalControlSignoffbyIDQuery 221000 package includes various packages, namely MessageHeader 221006 and Selection 221026.

The MessageHeader 221006 package is a BusinessDocumentMessageHeader 221012 datatype. The MessageHeader 221006 package includes a MessageHeader 221008 entity.

The MessageHeader 221008 entity has a cardinality of one 221010 meaning that for each instance of the InternalControlSignoffbyIDQuery 221002 entity there is one MessageHeader 221008 entity. The MessageHeader 221008 entity includes various attributes, namely ID 221014 and CreationDateTime 221020.

The ID 221014 attribute is a BusinessDocumentMessageID 221018 datatype. The ID 221014 attribute has a cardinality of one 221016 meaning that for each instance of the MessageHeader 221008 entity there is one ID 221014 attribute.

The CreationDateTime 221020 attribute is a DateTime 221024 datatype. The CreationDateTime 221020 attribute has a cardinality of one 221022 meaning that for each instance of the MessageHeader 221008 entity there is one CreationDateTime 221020 attribute.

The Selection 221026 package includes an InternalControlSignoff 221028 entity.

The InternalControlSignoff 221028 entity has a cardinality of one 221030 meaning that for each instance of the InternalControlSignoffbyIDQuery 221002 entity there is one InternalControlSignoff 221028 entity. The InternalControlSignoff 221028 entity includes various attributes, namely ID 221032, ReportingLineUnit_ID 221038, StartDate 221044 and EndDate 221050.

The ID 221032 attribute is an InternalControlSignoffID 221036 datatype. The ID 221032 attribute has a cardinality of optionally zero or one 221034 meaning that for each instance of the InternalControlSignoff 221028 entity there are optionally zero or one ID 221032 attribute.

The ReportingLineUnit_ID 221038 attribute is an OrganisationalCentreID 221042 datatype. The ReportingLineUnit_ID 221038 attribute has a cardinality of zero or one 221040 meaning that for each instance of the InternalControlSignoff 221028 entity there are optionally zero or one ReportingLineUnit_ID 221038 attributes.

The StartDate 221044 attribute is a StartDate 221048 datatype. The StartDate 221044 attribute has a cardinality of zero or one 221046 meaning that for each instance of the InternalControlSignoff 221028 entity there are optionally zero or one StartDate 221044 attributes.

The EndDate 221050 attribute is an EndDate 221054 datatype. The EndDate 221050 attribute has a cardinality of zero or one 221052 meaning that for each instance of the InternalControlSignoff 221028 entity there are optionally zero or one EndDate 221050 attributes.

MessageHeader Package

A MessageHeader package groups the business information that is relevant for sending a business document in a message.

MessageHeader

A MessageHeader groups business information from the perspective of the sending application. For example, information to identify the business document in a message Selection Package The Selection collects all the selection criteria for the InternalControlSignoffByID selection.

InternalControlSignoffSelectionByID

An InternalControlSignoffSelectionByID specifies the identifying elements to select an InternalControlSignoff. The selection criteria elements located at InternalControlSignoffSelectionByID are:

InternalControlSignoffID (may be optional) refers to a unique identifier for an InternalControlSignoff. ReportingLineUnitID (may be optional) refers to a unique identifier of a reporting line unit. StartDate (may be optional) refers to a date that defines the start of a time interval or timeframe. EndDate (may be optional) refers to a date that defines the end of a time interval or timeframe. You may specify either the InternalControlSignoffID or the ReportingLineUnitID.

Message Data Type

The message data type InternalControlSignoffByIDResponseMessage_sync contains the InternalControlSignoff included in the business document and the business information that is relevant for sending a business document in a message. FIGS. 222-1 through 222-4 show an InternalControlSignoffbyIDResponse 222000 package. The InternalControlSignoffbyIDResponse 222000 package is an InternalControlSignoffbyIDResponse 222004 datatype. The InternalControlSignoffbyIDResponse 222000 package includes an InternalControlSignoffbyIDResponse 222002 entity. The InternalControlSignoffbyIDResponse 222000 package includes various packages, namely MessageHeader 222006 and InternalControlSignoff 222026.

The MessageHeader 222006 package is a BusinessDocumentMessageHeader 222012 datatype. The MessageHeader 222006 package includes a MessageHeader 222008 entity.

The MessageHeader 222008 entity has a cardinality of one 222010 meaning that for each instance of the InternalControlSignoffbyIDResponse 222002 entity there is one MessageHeader 222008 entity. The MessageHeader 222008 entity includes various attributes, namely ID 222014 and CreationDateTime 222020.

The ID 222014 attribute is a BusinessDocumentMessageID 222018 datatype. The ID 222014 attribute has a cardinality of one 222016 meaning that for each instance of the MessageHeader 222008 entity there is one ID 222014 attribute.

The CreationDateTime 222020 attribute is a DateTime 222024 datatype. The CreationDateTime 222020 attribute has a cardinality of one 222022 meaning that for each instance of the MessageHeader 222008 entity there is one CreationDateTime 222020 attribute.

The InternalControlSignoff 222026 package includes an InternalControlSignoff 222028 entity. The InternalControlSignoff 222026 package includes an Attachment 2220152 package.

The InternalControlSignoff 222028 entity includes various attributes, namely SignOffID 222032, ReportingLineUnitID 222038, ReportingLineUnitName 222044, TimeframeName 222050, TimeframeStartDate 222056, TimeframeEndDate 222062, SignoffCompletedIndicator 222068, InternalControlSignoffStatusName 222074, Note 222080, SignoffDate 222086, IssueTotalNumberValue 222092, OpenIssueTotalNumberValue 222098, AttachmentTotalNumberValue 2220104, SignoffDisclaimerNote 2220110, ResponsibleBusinessPartnerInternalID 2220116, ResponsibleName 2220122, ResponsibleEmailAddress 2220128, SignedByBusinessPartnerInternalID 2220134, SignedByName 2220140 and SignedByEmailAddress 2220146.

The SignOffID 222032 attribute is a SingoffID 222036 datatype. The SignOffID 222032 attribute has a cardinality of one 222034 meaning that for each instance of the InternalControlSignoff 222028 entity there is one SignOffID 222032 attribute.

The ReportingLineUnitID 222038 attribute is an OrganisationalCentreID 222042 datatype. The ReportingLineUnitID 222038 attribute has a cardinality of one 222040 meaning that for each instance of the InternalControlSignoff 222028 entity there is one ReportingLineUnitID 222038 attribute.

The ReportingLineUnitName 222044 attribute is a MEDIUM_Name 222048 datatype. The ReportingLineUnitName 222044 attribute has a cardinality of one 222046 meaning that for each instance of the InternalControlSignoff 222028 entity there is one ReportingLineUnitName 222044 attribute.

The TimeframeName 222050 attribute is a MEDIUM_Name 222054 datatype. The TimeframeName 222050 attribute has a cardinality of one 222052 meaning that for each instance of the InternalControlSignoff 222028 entity there is one TimeframeName 222050 attribute.

The TimeframeStartDate 222056 attribute is a StartDate 222060 datatype. The TimeframeStartDate 222056 attribute has a cardinality of one 222058 meaning that for each instance of the InternalControlSignoff 222028 entity there is one TimeframeStartDate 222056 attribute.

The TimeframeEndDate 222062 attribute is an EndDate 222066 datatype. The TimeframeEndDate 222062 attribute has a cardinality of one 222064 meaning that for each instance of the InternalControlSignoff 222028 entity there is one TimeframeEndDate 222062 attribute.

The SignoffCompletedIndicator 222068 attribute is a CompletedIndicator 222072 datatype. The SignoffCompletedIndicator 222068 attribute has a cardinality of one 222070 meaning that for each instance of the InternalControlSignoff 222028 entity there is one SignoffCompletedIndicator 222068 attribute.

The InternalControlSignoffStatusName 222074 attribute is a SHORT_Name 222078 datatype. The InternalControlSignoffStatusName 222074 attribute has a cardinality of one 222076 meaning that for each instance of the InternalControlSignoff 222028 entity there is one InternalControlSignoffStatusName 222074 attribute.

The Note 222080 attribute is a Note 222084 datatype. The Note 222080 attribute has a cardinality of one 222082 meaning that for each instance of the InternalControlSignoff 222028 entity there is one Note 222080 attribute.

The SignoffDate 222086 attribute is a BusinessTransactionDocumentDate 222090 datatype. The SignoffDate 222086 attribute has a cardinality of one 222088 meaning that for each instance of the InternalControlSignoff 222028 entity there is one SignoffDate 222086 attribute.

The IssueTotalNumberValue 222092 attribute is a TotalNumberValue 222096 datatype. The IssueTotalNumberValue 222092 attribute has a cardinality of one 222094 meaning that for each instance of the InternalControlSignoff 222028 entity there is one IssueTotalNumberValue 222092 attribute.

The OpenIssueTotalNumberValue 222098 attribute is a TotalNumberValue 2220102 datatype. The OpenIssueTotalNumberValue 222098 attribute has a cardinality of one 2220100 meaning that for each instance of the InternalControlSignoff 222028 entity there is one OpenIssueTotalNumberValue 222098 attribute.

The AttachmentTotalNumberValue 2220104 attribute is a TotalNumberValue 2220108 datatype. The AttachmentTotalNumberValue 2220104 attribute has a cardinality of one 2220106 meaning that for each instance of the InternalControlSignoff 222028 entity there is one AttachmentTotalNumberValue 2220104 attribute.

The SignoffDisclaimerNote 2220110 attribute is a Note 2220114 datatype. The SignoffDisclaimerNote 2220110 attribute has a cardinality of one 2220112 meaning that for each instance of the InternalControlSignoff 222028 entity there is one SignoffDisclaimerNote 2220110 attribute.

The ResponsibleBusinessPartnerInternalID 2220116 attribute is a BusinessPartnerInternalID 2220120 datatype. The ResponsibleBusinessPartnerInternalID 2220116 attribute has a cardinality of zero or one 2220118 meaning that for each instance of the InternalControlSignoff 222028 entity there are optionally zero or one ResponsibleBusinessPartnerInternalID 2220116 attributes.

The ResponsibleName 2220122 attribute is a PersonFormattedName 2220126 datatype. The ResponsibleName 2220122 attribute has a cardinality of zero or one 2220124 meaning that for each instance of the InternalControlSignoff 222028 entity there are optionally zero or one ResponsibleName 2220122 attributes.

The ResponsibleEmailAddress 2220128 attribute is an EmailAddress 2220132 datatype. The ResponsibleEmailAddress 2220128 attribute has a cardinality of zero or one 2220130 meaning that for each instance of the InternalControlSignoff 222028 entity there are optionally zero or one ResponsibleEmailAddress 2220128 attributes.

The SignedByBusinessPartnerInternalID 2220134 attribute is a BusinessPartnerInternalID 2220138 datatype. The SignedByBusinessPartnerInternalID 2220134 attribute has a cardinality of one 2220136 meaning that for each instance of the InternalControlSignoff 222028 entity there is one SignedByBusinessPartnerInternalID 2220134 attribute.

The SignedByName 2220140 attribute is a PersonFormattedName 2220144 datatype. The SignedByName 2220140 attribute has a cardinality of one 2220142 meaning that for each instance of the InternalControlSignoff 222028 entity there is one SignedByName 2220140 attribute.

The SignedByEmailAddress 2220146 attribute is an EmailAddress 2220150 datatype. The SignedByEmailAddress 2220146 attribute has a cardinality of one 2220148 meaning that for each instance of the InternalControlSignoff 222028 entity there is one SignedByEmailAddress 2220146 attribute.

The Attachment 2220152 package is an AttachmentFolder 2220158 datatype. The Attachment 2220152 package includes an Attachment 2220154 entity.

MessageHeader Package

A MessageHeader package groups the business information that is relevant for sending a business document in a message.

MessageHeader

A MessageHeader groups business information from the perspective of the sending application, for example, information to identify the business document in a message.

InternalControlSignoff Package

The InternalControlSignoff package groups all the elements of the InternalControlSignoff for an organizational centre.

InternalControlSignoff

An InternalControlSignoff is an affirmation that an internal control has been implemented and that the internal control activities have been documented and assessed and that the result of those assessments hasn't produced any issues that could affect the correctness of the financial statement.

ID is a unique identifier for an InternalControlSignoff. ReportingLineUnitID is a unique identifier of an organizational unit. A ReportingLineUnitName is the name of the ReportingLineUnit. The TimeframeName is the name of the timeframe that is signed off. TimeframeStartDate is a date that defines the start of a time interval or timeframe. TimeframeEndDate is a date that defines the end of a time interval or timeframe. A SignoffCompletedIndicator specifies whether or not an InternalControlSignoff is completed. The InternalControlSignoffStatusName is the name of the status of an InternalControlSignoff. A Note is a natural-language comment on an InternalControlSignoff. SignoffDate is a date of the business document to which the InternalControlSignoff refers. An IssueTotalNumberValue is the number of InternalControlIssues of a total number. OpenIssueTotalNumberValue is the number of open InternalControlIssues of a total number. AttachmentTotalNumberValue is the number of attachments of a total number.

A SignoffDisclaimerNote is a natural-language comment on a disclaimer for the InternalControlSignoff. A ResponsibleBusinessPartnerInternalID (may be optional) is a unique identifier for the responsible for the InternalControlSignoff The ResponsibleName (may be optional) is the complete, formatted name for the responsible of the InternalControlSignoff.

A ResponsibleEmailAddress (may be optional) is the abbreviation for Electronic Mail Address and represents a digital and unique address in a mailbox system for a responsible. A SignedByBusinessPartnerInternalID (may be optional) is a unique identifier for the person who signed the InternalControlSignoff. The SignedByName is the complete, formatted name for the person who signed the InternalControlSignoff. A SignedByEmailAddress is the abbreviation for Electronic Mail Address and represents a digital and unique address in a mailbox system for a user who signed the InternalControlSignoff.

Attachment Package

An Attachment package groups all the attributes of an attachment that has been linked to the signoff.

Attachment

The Attachment is a document that is attached to the signoff.

Log Package

A Log package groups the error messages used for user interaction

Log

A Log is a sequence of messages that result when an application executes a task.

Message Data Type

The message data type SubordinateInternalControlSignoffByInternalControlSignoffQueryMessage_sync 202010 of FIG. 213 contains the selection included in the business document and the business information that is relevant for sending a business document in a message. The message data type 202010 includes a SubordinateInternalControlSignoffByInternalControlSignoffQueryMessage_sync entity 213004 and packages MessageHeader 213006 and Selection 213008.

MessageHeader Package

The MessageHeader package 213006 groups the business information that is relevant for sending a business document in a message. The package 213006 includes entity MessageHeader 213010.

MessageHeader

The MessageHeader entity 213010 groups business information from the perspective of the sending application, for example, information to identify the business document in a message Selection Package The Selection package 213008 collects all the selection criteria for the SubordinateInternalControlSignoffbyID selection. The package 213008 includes entity SubordinateInternalControlSignoffByInternalControlSignoff 213012.

SubordinateInternalControlSignoffSelectionByInternalControlSignoff

The SubordinateInternalControlSignoffSelectionByInternalControlSignoff entity 213012 specifies the elements to select the subordinate InternalControlSignoffs. The InternalControlSignoffID (may be optional) is a unique identifier for an InternalControlSignoff. A ReportingLineUnitID (may be optional) is a unique identifier of an organizational unit. StartDate (may be optional) is a date that defines the start of a time interval or timeframe. EndDate (may be optional) is a date that defines the end of a time interval or timeframe. Typically, it may be necessary to specify the InternalControlSignoffID or the ReportingLineUnitID.

The message data type SubordinateInternalControlSignoffByInternalControlSignoffResponseMessage_sync 202012 of FIG. 214 contains the SubordinateInternalControlSignoff included in the business document and the business information that is relevant for sending a business document in a message. The message data type 202012 includes entity SubordinateInternalControlSignoffByInternalControlSignoffResponseMessage_sync 214002 and packages MessageHeader 214004, InternalControlSignoff 214008, and Log 214016.

MessageHeader Package

The MessageHeader package 214004 groups the business information that is relevant for sending a business document in a message. The package 214004 includes entity MessageHeader 214006.

MessageHeader

The MessageHeader entity 214006 groups business information from the perspective of the sending application, for example, information to identify the business document in a message.

InternalControlSignoff Package

The InternalControlSignoff package 214008 groups all the elements of the InternalControlSignoff for an organizational centre. The package 214008 includes entity InternalControlSignoff 214010 and package Attachment 214012.

InternalControlSignoff

The InternalControlSignoff 214010 is an affirmation that an internal control has been implemented, that the internal control activities have been documented and assessed, and that the result of those assessments has not produced any issues that could affect the correctness of the financial statement.

The ID is a unique identifier for an InternalControlSignoff. A ReportingLineUnitID is a unique identifier of an organizational unit. A ReportingLineUnitName is the name of the ReportingLineUnit. The TimeframeName is the name of the timeframe that is signed off. TimeframeStartDate is a date that defines the start of a time interval or timeframe. TimeframeEndDate is a date that defines the end of a time interval or timeframe. A SignoffCompletedIndicator specifies whether an InternalControlSignoff is completed. The InternalControlSignoffStatusName is the name of the status of an InternalControlSignoff. A Note is a natural-language comment on an InternalControlSignoff. SignoffDate is a date of the business document to which the InternalControlSignoff refers. An IssueTotalNumberValue is the number of InternalControlIssues of a total number. OpenIssueTotalNumberValue is the number of open InternalControlIssues of a total number. An Attachment TotalNumberValue is the number of attachments of a total number. A SignoffDisclaimerNote is a natural-language comment on a disclaimer for the InternalControlSignoff. A ResponsibleBusinessPartnerInternalID (may be optional) is a unique identifier for the responsible for the InternalControlSignoff. The ResponsibleName (may be optional) is the complete, formatted name for the responsible of the InternalControlSignoff. A ResponsibleEmailAddress (may be optional) is the abbreviation for Electronic Mail Address and represents a digital and unique address in a mailbox system for a responsible. A SignedByBusinessPartnerInternalID is a unique identifier for the person who signed the InternalControlSignoff. The SignedByName is the complete, formatted name for the person who signed the InternalControlSignoff. A SignedByEmailAddress is the abbreviation for Electronic Mail Address and represents a digital and unique address in a mailbox system for a user who signed the InternalControlSignoff.

Attachment Package

Attachment package 214012 groups all the attributes of an attachment that has been linked to the signoff. Attachment package 214012 includes Attachment entity 214014.

Log Package

The Log package 214016 groups the error messages used for user interaction. Log package 214016 includes Log entity 214018.

Log

The Log entity 214018 is a sequence of messages that result when an application executes a task.

Message Data Type

The message data type InternalControlSignoffPerformRequestMessage_sync contains the InternalControlSignoff included in the business document and the business information that is relevant for sending a business document in a message. FIGS. 223-1 through 223-2 show an InternalControlSignoffbyPerformRequest 223000 package. The InternalControlSignoffbyPerformRequest 223000 package is an InternalControlSignoffbyIDPerformRequest 223004 datatype. The InternalControlSignoffbyPerformRequest 223000 package includes an InternalControlSignoffbyPerformRequest 223002 entity. The InternalControlSignoffbyPerformRequest 223000 package includes various packages, namely MessageHeader 223006 and InternalControlSignoff 223026.

The MessageHeader 223006 package is a BusinessDocumentMessageHeader 223012 datatype. The MessageHeader 223006 package includes a MessageHeader 223008 entity.

The MessageHeader 223008 entity has a cardinality of one 223010 meaning that for each instance of the InternalControlSignoffbyPerformRequest 223002 entity there is one MessageHeader 223008 entity. The MessageHeader 223008 entity includes various attributes, namely ID 223014 and CreationDateTime 223020.

The ID 223014 attribute is a BusinessDocumentMessageID 223018 datatype. The ID 223014 attribute has a cardinality of one 223016 meaning that for each instance of the MessageHeader 223008 entity there is one ID 223014 attribute.

The CreationDateTime 223020 attribute is a DateTime 223024 datatype. The CreationDateTime 223020 attribute has a cardinality of one 223022 meaning that for each instance of the MessageHeader 223008 entity there is one CreationDateTime 223020 attribute.

The InternalControlSignoff 223026 package includes an InternalControlSignoff 223028 entity. The InternalControlSignoff 223028 entity includes various attributes, namely ID 223034, SignoffCompletedIndicator 223040 and Note 223046.

The ID 223034 attribute is an InternalControlSignoffID 223038 datatype. The ID 223034 attribute has a cardinality of one 223036 meaning that for each instance of the InternalControlSignoff 223028 entity there is one ID 223034 attribute.

The SignoffCompletedIndicator 223040 attribute is a CompletedIndicator 223044 datatype. The SignoffCompletedIndicator 223040 attribute has a cardinality of one 223042 meaning that for each instance of the InternalControlSignoff 223028 entity there is one SignoffCompletedIndicator 223040 attribute.

The Note 223046 attribute is a Note 223050 datatype. The Note 223046 attribute has a cardinality of zero or one 223048 meaning that for each instance of the InternalControlSignoff 223028 entity there are optionally zero or one Note 223046 attributes.

MessageHeader Package

A MessageHeader package groups the business information that is relevant for sending a business document in a message.

MessageHeader

A MessageHeader groups business information from the perspective of the sending application, for example, information to identify the business document in a message.

SenderParty

A SenderParty is the party responsible for sending a business document at business application level.

RecipientParty

A RecipientParty is the party responsible for receiving a business document at business application level.

InternalControlSignoff Package

The InternalControlSignoff package contains the InternalControlSignoff for which the request is performed.

InternalControlSignoff

An InternalControlSignoff is an affirmation that an internal control has been implemented, that the internal control activities have been documented and assessed, and that the result of those assessments has not produced any issues that could affect the correctness of the financial statement. An ID is a unique identifier for an InternalControlSignoff. A SignoffCompletedIndicator specifies whether an InternalControlSignoff is completed. A Note is a natural-language comment on an InternalControlSignoff.

Message Data Type

The message data type InternalControlSignoffPerformConfirmationMessage_sync contains, for example, the business information that is relevant for sending a business document in a message. FIG. 224 shows an InternalControlSignoffPerformConfirmation 224000 package. The InternalControlSignoffPerformConfirmation 224000 package is an InternalControlSignoffPerformConfirmation 224004 datatype. The InternalControlSignoffPerformConfirmation 224000 package includes an InternalControlSignoffPerformConfirmation 224002 entity. The InternalControlSignoffPerformConfirmation 224000 package includes various packages, namely MessageHeader 224006 and Log 224026.

The MessageHeader 224006 package is a BusinessDocumentMessageHeader 224012 datatype. The MessageHeader 224006 package includes a MessageHeader 224008 entity.

The MessageHeader 224008 entity has a cardinality of one 224010 meaning that for each instance of the InternalControlSignoffPerformConfirmation 224002 entity there is one MessageHeader 224008 entity. The MessageHeader 224008 entity includes various attributes, namely ID 224014 and CreationDateTime 224020.

The ID 224014 attribute is a BusinessDocumentMessageID 224018 datatype. The ID 224014 attribute has a cardinality of one 224016 meaning that for each instance of the MessageHeader 224008 entity there is one ID 224014 attribute.

The CreationDateTime 224020 attribute is a DateTime 224024 datatype. The CreationDateTime 224020 attribute has a cardinality of one 224022 meaning that for each instance of the MessageHeader 224008 entity there is one CreationDateTime 224020 attribute.

The Log 224026 package is a Log 224032 datatype. The Log 224026 package includes a Log 224028 entity.

The Log 224028 entity has a cardinality of one 224030 meaning that for each instance of the InternalControlSignoffPerformConfirmation 224002 entity there is one Log 224028 entity.

MessageHeader Package

A MessageHeader package groups the business information that is relevant for sending a business document in a message.

MessageHeader

A MessageHeader groups business information from the perspective of the sending application, for example, information to identify the business document in a message.

SenderParty

A SenderParty is the party responsible for sending a business document at business application level.

RecipientParty

A RecipientParty is the party responsible for receiving a business document at business application level.

Log Package

A Log package groups the error messages used for user interaction

Log

A Log is a sequence of messages that result when an application executes a task.

Message Data Type

The message data type InternalControlSignoffAttachmentByIDQueryMessage_sync contains the Selection included in the business document and the business information that is relevant for sending a business document in a message. FIGS. 215-1 through 215-2 show an InternalControlSignoffAttachmentbyIDQuery 215000 package. The InternalControlSignoffAttachmentbyIDQuery 215000 package is an InternalControlSignoffAttachmentbyIDQuery 215004 datatype. The InternalControlSignoffAttachmentbyIDQuery 215000 package includes an InternalControlSignoffAttachmentbyIDQuery 215002 entity. The InternalControlSignoffAttachmentbyIDQuery 215000 package includes various packages, namely MessageHeader 215006 and Selection 215026.

The MessageHeader 215006 package is a BusinessDocumentMessageHeader 215012 datatype. The MessageHeader 215006 package includes a MessageHeader 215008 entity.

The MessageHeader 215008 entity has a cardinality of one 215010 meaning that for each instance of the InternalControlSignoffAttachmentbyIDQuery 215002 entity there is one MessageHeader 215008 entity. The MessageHeader 215008 entity includes various attributes, namely ID 215014 and CreationDateTime 215020.

The ID 215014 attribute is a BusinessDocumentMessageID 215018 datatype. The ID 215014 attribute has a cardinality of one 215016 meaning that for each instance of the MessageHeader 215008 entity there is one ID 215014 attribute.

The CreationDateTime 215020 attribute is a DateTime 215024 datatype. The CreationDateTime 215020 attribute has a cardinality of one 215022 meaning that for each instance of the MessageHeader 215008 entity there is one CreationDateTime 215020 attribute.

The Selection 215026 package includes an InternalControlSignoffAttachment 215028 entity.

The InternalControlSignoffAttachment 215028 entity has a cardinality of one 215030 meaning that for each instance of the InternalControlSignoffAttachmentbyIDQuery 215002 entity there is one InternalControlSignoffAttachment 215028 entity. The InternalControlSignoffAttachment 215028 entity includes various attributes, namely InternalControlSignoffID 215034, ReportingLineUnitID 215040, StartDate 215046 and EndDate 215052.

The InternalControlSignoffID 215034 attribute is an InternalControlSignoffID 215038 datatype. The InternalControlSignoffID 215034 attribute has a cardinality of one 215036 meaning that for each instance of the InternalControlSignoffAttachment 215028 entity there is one InternalControlSignoffID 215034 attribute.

The ReportingLineUnitID 215040 attribute is an OrganisationalCentreID 215044 datatype. The ReportingLineUnitID 215040 attribute has a cardinality of one 215042 meaning that for each instance of the InternalControlSignoffAttachment 215028 entity there is one ReportingLineUnitID 215040 attribute.

The StartDate 215046 attribute is a StartDate 215050 datatype. The StartDate 215046 attribute has a cardinality of one 215048 meaning that for each instance of the InternalControlSignoffAttachment 215028 entity there is one StartDate 215046 attribute.

The EndDate 215052 attribute is an EndDate 215056 datatype. The EndDate 215052 attribute has a cardinality of one 215054 meaning that for each instance of the InternalControlSignoffAttachment 215028 entity there is one EndDate 215052 attribute.

MessageHeader Package

A MessageHeader package groups the business information that is relevant for sending a business document in a message.

MessageHeader

A MessageHeader groups business information from the perspective of the sending application, for example, information to identify the business document in a message.

Selection Package

The Selection collects all the selection criteria for the InternalControlSignoffAttachmentByID selection.

InternalControlSignoffAttachmentSelectionByID

An InternalControlSignoffAttachmentSelectionByID specifies the identifying elements to select an InternalControlSignoffAttachment. An InternalControlSignoffID is is a unique identifier for an InternalControlSignoff. A ReportingLineUnitID is a unique identifier of an organizational unit. StartDate is a date that defines the start of a time interval or timeframe. EndDate is a date that defines the end of a time interval or timeframe.

Message Data Type

The message data type InternalControlSignoffAttachmentByIDResponseMessage_sync contains the InternalControlSignoff included in the business document and the business information that is relevant for sending a business document in a message. FIG. 216 shows an InternalControlSignoffAttachmentbyIDResponse 216000 package. The InternalControlSignoffAttachmentbyIDResponse 216000 package is an InternalControlSignoffAttachmentbyIDResponse 216004 datatype. The InternalControlSignoffAttachmentbyIDResponse 216000 package includes an InternalControlSignoffAttachmentbyIDResponse 216002 entity. The InternalControlSignoffAttachmentbyIDResponse 216000 package includes various packages, namely MessageHeader 216006 and InternalControlSignoff 216026.

The MessageHeader 216006 package is a BusinessDocumentMessageHeader 216012 datatype. The MessageHeader 216006 package includes a MessageHeader 216008 entity.

The MessageHeader 216008 entity has a cardinality of one 216010 meaning that for each instance of the InternalControlSignoffAttachmentbyIDResponse 216002 entity there is one MessageHeader 216008 entity. The MessageHeader 216008 entity includes various attributes, namely ID 216014 and CreationDateTime 216020.

The ID 216014 attribute is a BusinessDocumentMessageID 216018 datatype. The ID 216014 attribute has a cardinality of one 216016 meaning that for each instance of the MessageHeader 216008 entity there is one ID 216014 attribute.

The CreationDateTime 216020 attribute is a DateTime 216024 datatype. The CreationDateTime 216020 attribute has a cardinality of one 216022 meaning that for each instance of the MessageHeader 216008 entity there is one CreationDateTime 216020 attribute.

The InternalControlSignoff 216026 package includes an InternalControlSignoff 216028 entity. The InternalControlSignoff 216026 package includes an Attachment 216040 package.

The InternalControlSignoff 216028 entity includes an ID 216034 attribute.

The ID 216034 attribute is an InternalControlSignoffID 216038 datatype. The ID 216034 attribute has a cardinality of one 216036 meaning that for each instance of the InternalControlSignoff 216028 entity there is one ID 216034 attribute.

The Attachment 216040 package is an AttachmentFolder 216046 datatype. The Attachment 216040 package includes an Attachment 216042 entity.

MessageHeader Package

A MessageHeader package groups the business information that is relevant for sending a business document in a message.

MessageHeader

A MessageHeader groups business information from the perspective of the sending application, for example, information to identify the business document in a message.

InternalControlSignoff Package

The InternalControlSignoff package contains the InternalControlSignoff for an organizational centre.

InternalControlSignoff

An InternalControlSignoff is an affirmation that an internal control has been implemented, that the internal control activities have been documented and assessed, and that the result of those assessments has not produced any issues that could affect the correctness of the financial statement.

Attachment Package

An Attachment package groups all the attributes of an attachment that has been linked to the signoff.

Attachment

The Attachment is a document that is attached to the signoff.

Log Package

A Log package groups the error messages used for user interaction

Log

A Log is a sequence of messages that result when an application executes a task.

Message Data Type

The message data type InternalControlSignoffAttachmentCreateRequestMessage_sync contains the InternalControlSignoffAttachment included in the business document and the business information that is relevant for sending a business document in a message. FIGS. 220-1 through 220-2 show an InternalControlSignoffAttachmentCreateRequest 220000 package. The InternalControlSignoffAttachmentCreateRequest 220000 package is an InternalControlSignoffAttachmentCreateRequest 220004 datatype. The InternalControlSignoffAttachmentCreateRequest 220000 package includes an InternalControlSignoffAttachmentCreateRequest 220002 entity. The InternalControlSignoffAttachmentCreateRequest 220000 package includes various packages, namely MessageHeader 220006 and InternalControlSignOffAttachment 220026.

The MessageHeader 220006 package is a BusinessDocumentMessageHeader 220012 datatype. The MessageHeader 220006 package includes a MessageHeader 220008 entity. The MessageHeader 220008 entity has a cardinality of one 220010 meaning that for each instance of the InternalControlSignoffAttachmentCreateRequest 220002 entity there is one MessageHeader 220008 entity. The MessageHeader 220008 entity includes various attributes, namely ID 220014 and CreationDateTime 220020.

The ID 220014 attribute is a BusinessDocumentMessageID 220018 datatype. The ID 220014 attribute has a cardinality of one 220016 meaning that for each instance of the MessageHeader 220008 entity there is one ID 220014 attribute.

The CreationDateTime 220020 attribute is a DateTime 220024 datatype. The CreationDateTime 220020 attribute has a cardinality of one 220022 meaning that for each instance of the MessageHeader 220008 entity there is one CreationDateTime 220020 attribute.

The InternalControlSignOffAttachment 220026 package includes various entities, namely InternalControlSignOff 220028 and Attachment 220056.

The InternalControlSignOff 220028 entity has a cardinality of one 220030 meaning that for each instance of the InternalControlSignoffAttachmentCreateRequest 220002 entity there is one InternalControlSignOff 220028 entity. The InternalControlSignOff 220028 entity includes various attributes, namely ID 220032, ReportingLineUnitID 220038, StartDate 220044 and EndDate 220050.

The ID 220032 attribute is an InternalControlSignoffID 220036 datatype. The ID 220032 attribute has a cardinality of one 220034 meaning that for each instance of the InternalControlSignOff 220028 entity there is one ID 220032 attribute.

The ReportingLineUnitID 220038 attribute is an OrganisationalCentreID 220042 datatype. The ReportingLineUnitID 220038 attribute has a cardinality of one 220040 meaning that for each instance of the InternalControlSignOff 220028 entity there is one ReportingLineUnitID 220038 attribute.

The StartDate 220044 attribute is a StartDate 220048 datatype. The StartDate 220044 attribute has a cardinality of one 220046 meaning that for each instance of the InternalControlSignOff 220028 entity there is one StartDate 220044 attribute.

The EndDate 220050 attribute is an EndDate 220054 datatype. The EndDate 220050 attribute has a cardinality of one 220052 meaning that for each instance of the InternalControlSignOff 220028 entity there is one EndDate 220050 attribute.

The Attachment 220056 entity includes various attributes, namely DocumentCategoryCode 220058, DocumentName 220064, FileContentBinaryObject 220070 and DocumentPathName 220076.

The DocumentCategoryCode 220058 attribute is a DocumentCategoryCode 220062 datatype. The DocumentCategoryCode 220058 attribute has a cardinality of one 220060 meaning that for each instance of the Attachment 220056 entity there is one DocumentCategoryCode 220058 attribute.

The DocumentName 220064 attribute is a DocumentName 220068 datatype. The DocumentName 220064 attribute has a cardinality of one 220066 meaning that for each instance of the Attachment 220056 entity there is one DocumentName 220064 attribute.

The FileContentBinaryObject 220070 attribute is a FileContentBinaryObject 220074 datatype. The FileContentBinaryObject 220070 attribute has a cardinality of zero or one 220072 meaning that for each instance of the Attachment 220056 entity there may be one FileContentBinaryObject 220070 attribute.

The DocumentPathName 220076 attribute is a DocumentPathName 220080 datatype. The DocumentPathName 220076 attribute has a cardinality of zero or one 220078 meaning that for each instance of the Attachment 220056 entity there may be one DocumentPathName 220076 attribute.

MessageHeader Package

A MessageHeader package groups the business information that is relevant for sending a business document in a message.

MessageHeader

A MessageHeader groups business information from the perspective of the sending application, for example, information to identify the business document in a message InternalControlSignoffAttachment Package The InternalControlSignoffAttachment package contains the InternalControlSignoffAttachment to be created.

InternalControlSignoff

An InternalControlSignoff is an affirmation that an internal control has been implemented, that the internal control activities have been documented and assessed, and that the result of those assessments has not produced any issues that could affect the correctness of the financial statement.

An ID is a unique identifier for an InternalControlSignoff. A ReportingLineUnitID is a unique identifier of an organizational unit. StartDate is a date that defines the start of a time interval or timeframe. EndDate is a date that defines the end of a time interval or timeframe.

Attachment

The Attachment is a document that is attached to the assessment. The DocumentCategoryCode is the coded information of the document category. The DocumentName is the name of the document. FileContentBinaryObject (may be optional) is a finite data stream of any number of characters in binary notation (octets). The DocumentPathName (may be optional) is the name of the document path.

Message Data Type

The message data type InternalControlSignoffAttachmentCreateConfirmationMessage_sync contains, for example, the business information that is relevant for sending a business document in a message. FIG. 219 shows an InternalControlSignoffAttachmentCreateConfirmation 219000 package. The InternalControlSignoffAttachmentCreateConfirmation 219000 package is an InternalControlSignoffAttachmentCreateConfirmation 219004 datatype. The InternalControlSignoffAttachmentCreateConfirmation 219000 package includes an InternalControlSignoffAttachmentCreateConfirmation 219002 entity. The InternalControlSignoffAttachmentCreateConfirmation 219000 package includes various packages, namely MessageHeader 219006 and Log 219026.

The MessageHeader 219006 package is a BusinessDocumentMessageHeader 219012 datatype. The MessageHeader 219006 package includes a MessageHeader 219008 entity.

The MessageHeader 219008 entity has a cardinality of one 219010 meaning that for each instance of the InternalControlSignoffAttachmentCreateConfirmation 219002 entity there is one MessageHeader 219008 entity. The MessageHeader 219008 entity includes various attributes, namely ID 219014 and CreationDateTime 219020.

The ID 219014 attribute is a BusinessDocumentMessageID 219018 datatype. The ID 219014 attribute has a cardinality of one 219016 meaning that for each instance of the MessageHeader 219008 entity there is one ID 219014 attribute.

The CreationDateTime 219020 attribute is a DateTime 219024 datatype. The CreationDateTime 219020 attribute has a cardinality of one 219022 meaning that for each instance of the MessageHeader 219008 entity there is one CreationDateTime 219020 attribute.

The Log 219026 package is a Log 219032 datatype. The Log 219026 package includes a Log 219028 entity.

The Log 219028 entity has a cardinality of one 219030 meaning that for each instance of the InternalControlSignoffAttachmentCreateConfirmation 219002 entity there is one Log 219028 entity.

MessageHeader Package

A MessageHeader package groups the business information that is relevant for sending a business document in a message.

MessageHeader

A MessageHeader groups business information from the perspective of the sending application, for example, information to identify the business document in a message.

Log Package

A Log package groups the error messages used for user interaction

Log

A Log is a sequence of messages that result when an application executes a task.

Message Data Type

The message data type InternalControlSignoffAttachmentCancelRequestMessage_sync contains the InternalControlSignoffAttachment included in the business document and the business information that is relevant for sending a business document in a message. FIGS. 218-1 through 218-2 show an InternalControlSignoffAttachmentCancelRequest 218000 package. The InternalControlSignoffAttachmentCancelRequest 218000 package is an InternalControlSignoffAttachmentCancelRequest 218004 datatype. The InternalControlSignoffAttachmentCancelRequest 218000 package includes an InternalControlSignoffAttachmentCancelRequest 218002 entity. The InternalControlSignoffAttachmentCancelRequest 218000 package includes various packages, namely MessageHeader 218006 and SignOffAttachment 218026.

The MessageHeader 218006 package is a BusinessDocumentMessageHeader 218012 datatype. The MessageHeader 218006 package includes a MessageHeader 218008 entity. The MessageHeader 218008 entity has a cardinality of one 218010 meaning that for each instance of the InternalControlSignoffAttachmentCancelRequest 218002 entity there is one MessageHeader 218008 entity. The MessageHeader 218008 entity includes various attributes, namely ID 218014 and CreationDateTime 218020.

The ID 218014 attribute is a BusinessDocumentMessageID 218018 datatype. The ID 218014 attribute has a cardinality of one 218016 meaning that for each instance of the MessageHeader 218008 entity there is one ID 218014 attribute.

The CreationDateTime 218020 attribute is a DateTime 218024 datatype. The CreationDateTime 218020 attribute has a cardinality of one 218022 meaning that for each instance of the MessageHeader 218008 entity there is one CreationDateTime 218020 attribute.

The SignOffAttachment 218026 package includes an InternalControlSignOff 218028 entity.

The InternalControlSignOff 218028 entity has a cardinality of one 218030 meaning that for each instance of the InternalControlSignoffAttachmentCancelRequest 218002 entity there is one InternalControlSignOff 218028 entity. The InternalControlSignOff 218028 entity includes various attributes, namely ID 218034, ReportingLineUnitID 218040, StartDate 218046, EndDate 218052, DocumentCategoryCode 218058 and AttachmentID 218064.

The ID 218034 attribute is an InternalControlSignoffID 218038 datatype. The ID 218034 attribute has a cardinality of one 218036 meaning that for each instance of the InternalControlSignOff 218028 entity there is one ID 218034 attribute.

The ReportingLineUnitID 218040 attribute is an OrganisationalCentreID 218044 datatype. The ReportingLineUnitID 218040 attribute has a cardinality of one 218042 meaning that for each instance of the InternalControlSignOff 218028 entity there is one ReportingLineUnitID 218040 attribute.

The StartDate 218046 attribute is a StartDate 218050 datatype. The StartDate 218046 attribute has a cardinality of one 218048 meaning that for each instance of the InternalControlSignOff 218028 entity there is one StartDate 218046 attribute.

The EndDate 218052 attribute is an EndDate 218056 datatype. The EndDate 218052 attribute has a cardinality of one 218054 meaning that for each instance of the InternalControlSignOff 218028 entity there is one EndDate 218052 attribute.

The DocumentCategoryCode 218058 attribute is a DocumentCategoryCode 218062 datatype. The DocumentCategoryCode 218058 attribute has a cardinality of one 218060 meaning that for each instance of the InternalControlSignOff 218028 entity there is one DocumentCategoryCode 218058 attribute.

The AttachmentID 218064 attribute is an AttachmentID 218068 datatype. The AttachmentID 218064 attribute has a cardinality of one 218066 meaning that for each instance of the InternalControlSignOff 218028 entity there is one AttachmentID 218064 attribute.

MessageHeader Package

A MessageHeader package groups the business information that is relevant for sending a business document in a message.

MessageHeader

A MessageHeader groups business information from the perspective of the sending application, for example, information to identify the business document in a message InternalControlSignoffAttachment Package The InternalControlSignoffAttachment package contains the InternalControlSignoffAttachment to be canceled.

InternalControlSignoff

An InternalControlSignoff is an affirmation that an internal control has been implemented, that the internal control activities have been documented and assessed, and that the result of those assessments has not produced any issues that could affect the correctness of the financial statement. An ID is a unique identifier for an InternalControlSignoff. A ReportingLineUnitID is a unique identifier of an organizational unit. StartDate is a date that defines the start of a time interval or timeframe. EndDate is a date that defines the end of a time interval or timeframe.

Attachment

The Attachment is a document that is attached to the assessment. The DocumentCategoryCode is the coded information of the document category. The AttachmentID is the unique identifier of an attachment.

Message Data Type

The message data type InternalControlSignoffAttachmentCancelConfirmationMessage_sync contains, for example, the business information that is relevant for sending a business document in a message. FIG. 217 shows an InternalControlSignoffAttachmentCancelConfirmation 217000 package. The InternalControlSignoffAttachmentCancelConfirmation 217000 package is an InternalControlSignoffAttachmentCancelConfirmation 217004 datatype. The InternalControlSignoffAttachmentCancelConfirmation 217000 package includes an InternalControlSignoffAttachmentCancelConfirmation 217002 entity. The InternalControlSignoffAttachmentCancelConfirmation 217000 package includes various packages, namely MessageHeader 217006 and Log 217026.

The MessageHeader 217006 package is a BusinessDocumentMessageHeader 217012 datatype. The MessageHeader 217006 package includes a MessageHeader 217008 entity.

The MessageHeader 217008 entity has a cardinality of one 217010 meaning that for each instance of the InternalControlSignoffAttachmentCancelConfirmation 217002 entity there is one MessageHeader 217008 entity. The MessageHeader 217008 entity includes various attributes, namely ID 217014 and CreationDateTime 217020.

The ID 217014 attribute is a BusinessDocumentMessageID 217018 datatype. The ID 217014 attribute has a cardinality of one 217016 meaning that for each instance of the MessageHeader 217008 entity there is one ID 217014 attribute.

The CreationDateTime 217020 attribute is a DateTime 217024 datatype. The CreationDateTime 217020 attribute has a cardinality of one 217022 meaning that for each instance of the MessageHeader 217008 entity there is one CreationDateTime 217020 attribute.

The Log 217026 package is a Log 217032 datatype. The Log 217026 package includes a Log 217028 entity.

The Log 217028 entity has a cardinality of one 217030 meaning that for each instance of the InternalControlSignoffAttachmentCancelConfirmation 217002 entity there is one Log 217028 entity.

MessageHeader Package

A MessageHeader package groups the business information that is relevant for sending a business document in a message.

MessageHeader

A MessageHeader groups business information from the perspective of the sending application, for example, information to identify the business document in a message.

Log Package

A Log package groups the error messages used for user interaction

Log

A Log is a sequence of messages that result when an application executes a task.

MaintenanceIssueCategoryCatalogue Interfaces

Maintenance—planned or unplanned—for a machine are examples of business events in which maintenance-related issues may have to be addressed. E.g. a maintenance technician receives a request to maintain an industry robot for the 10,000 hour inspection. Some parts of the robot need to be exchanged. For maintenance request reasons he looks up in the maintenance issue category catalogue for the specific category 'Robot part exchange' in the context of the parent category 'Robot Inspection' and catalogue 'Robot01'.

Message Choreography

The message choreography of FIG. 225 describes a possible logical sequence of messages that can be used to realize a maintenance issue category catalogue business scenario. A MaintenanceIssueCategoryCatalogueSimpleByProfileMaintenanceRequestTypeCodeQuery_sync is an inquiry to MaintenanceMasterDataManagement for a MaintenanceIssueCategoryCatalogueSimple. The structure of the message type MaintenanceIssueCategoryCatalogueSimpleByProfileMaintenanceRequestTypeCode Query_sync is specified by the message data type MaintenanceIssueCategoryCatalogueSimpleByProfileMaintenanceRequestTypeCodeQuery Message_sync.

A MaintenanceIssueCategoryCatalogueSimpleByProfileMaintenanceRequestTypeCodeResponse_sync is the response to MaintenanceIssueCategoryCatalogueSimpleByProfileMaintenanceRequestTypeCodeQuery_sync. The structure of the message type MaintenanceIssueCategoryCatalogueSimpleByProfileMaintenanceRequestTypeCodeResponse_sync is specified by the message data type MaintenanceIssueCategoryCatalogueSimpleByProfileMaintenanceRequestTypeCodeResponseMessage_sync.

A MaintenanceIssueCategoryCatalogueCategoryByIDQuery_sync is an inquiry to MaintenanceMasterDataManagement for a MaintenanceIssueCategoryCatalogueCategory. The structure of the message type MaintenanceIssueCategoryCatalogueCategoryByIDQuery_sync is specified by the message data type MaintenanceIssueCategoryCatalogueCategoryByIDQueryMessage_sync.

A MaintenanceIssueCategoryCatalogueCategoryByIDResponse_sync is the response to MaintenanceIssueCategoryCatalogueCategoryByIDQuery_sync. The structure of the message type MaintenanceIssueCategoryCatalogueCategoryByIDResponse_sync is specified by the message data type MaintenanceIssueCategoryCatalogueCategoryByIDResponseMessage_sync.

For example, a “Maintenance Technician” system 225002 can query a maintenance issue category catalogue by profile maintenance request type code using the MaintenanceIssueCategoryCatalogueSimpleByProfileMaintenanceRequestTypeCodeQuery_sync message 225006 as shown, for example, in FIG. 228. A “Maintenance Master Data Management” system 225004 can respond to the request using the MaintenanceIssueCategoryCatalogueSimpleByProfileMaintenanceRequestTypeCodeResponse_sync message 225008 as shown, for example, in FIG. 229. The “Maintenance Technician” system 225002 can query a maintenance issue category catalogue by ID code using the MaintenanceIssueCategoryCatalogueCategoryByIDQuery_sync message 225010 as shown, for example, in FIG. 226. The “Maintenance Master Data Management” system 225004 can respond to the request using the MaintenanceIssueCategoryCatalogueCategoryByIDResponse_sync message 225012 as shown, for example, in FIG. 227.

The message data type MaintenanceIssueCategoryCatalogueSimpleByProfileMaintenanceRequestTypeCodeQuery Message_sync has the Selection included in the business document MaintenanceIssueCategoryCatalogue. FIG. 232 shows a MaintenanceIssueCategoryCatalogueSimpleByProfileMaintenanceRequestTypeCodeQuery Message_sync 232000 package. The MaintenanceIssueCategoryCatalogueSimpleByProfileMaintenanceRequestTypeCodeQuery Message_sync 232000 package is a MaintenanceIssueCategoryCatalogueSimpleByProfileMaintenanceRequestTypeCodeQuery Message_sync 232004 datatype. The MaintenanceIssueCategoryCatalogueSimpleByProfileMaintenanceRequestTypeCodeQuery Message_sync 232000 package includes a MaintenanceIssueCategoryCatalogueSimpleByProfileMaintenanceRequestTypeCodeQuery Message_sync 232002 entity. The MaintenanceIssueCategoryCatalogueSimpleByProfileMaintenanceRequestTypeCodeQuery Message_sync 232000 package includes a Selection 232006 package.

The Selection 232006 package includes a MaintenanceIssueCategoryCatalogueSimpleSelectionByProfileMaintenanceRequestTypeCode 232008 entity.

The MaintenanceIssueCategoryCatalogueSimpleSelectionByProfileMaintenanceRequestTypeCode 232008 entity has various subordinate entities, namely ProfileMaintenanceRequestTypeCode 232014 and LanguageCode 232020.

The Selection package collects the selection criteria for MaintenanceIssueCategoryCatalogueID and the corresponding MaintenanceIssueCategoryTypeCode. It has the entity MaintenanceIssueCategoryCatalogueSimpleSelectionByMaintenanceRequestTypeCode.

MaintenanceIssueCategoryCatalogueSimpleSelectionByProfileMaintenanceRequest TypeCode specifies selection criteria to select MaintenanceIssueCategoryCatalogues and their corresponding MaintenanceIssueCategoryCatalogueMaintenanceIssueCategoryTypeCodes by MaintenanceIssueCategoryCatalogueProfileMaintenanceRequestTypeCode. ProfileMaintenanceRequestTypeCode is the encoded representation of the type of MaintenanceRequests. A LanguageCode, which can optionally be included, is the encoded representation of the default language of the catalogue related name(s) and description(s). If no language code is given the system language will be used as default.

Message Data Type

The message data type MaintenanceIssueCategoryCatalogueSimpleByProfileMaintenanceRequestTypeCodeResponseMessage_sync has the MaintenanceIssueCategoryCatalogue included in the business document and the Log. It has the packages MaintenanceIssueCategoryCatalogue. FIGS. 233-1 through 233-2 show a MaintenanceIssueCategoryCatalogueSimpleByProfileMaintenanceRequestTypeCodeResponseMessage_sync 233000 package. The MaintenanceIssueCategoryCatalogueSimpleByProfileMaintenanceRequestTypeCodeResponseMessage_sync 233000 package is a MaintenanceIssueCategoryCatalogueSimpleByProfileMaintenanceRequestTypeCodeResponseMessage_sync 233004 datatype. The MaintenanceIssueCategoryCatalogueSimpleByProfileMaintenanceRequestTypeCodeResponseMessage_sync 233000 package includes a MaintenanceIssueCategoryCatalogueSimpleByProfileMaintenanceRequestTypeCodeResponseMessage_sync 233002 entity. The MaintenanceIssueCategoryCatalogueSimpleByProfileMaintenanceRequestTypeCodeResponseMessage_sync 233000 package includes various packages, namely MaintenanceIssueCategoryCatalogue 233006 and Log 233036.

The MaintenanceIssueCategoryCatalogue 233006 package includes a MaintenanceIssueCategoryCatalogue 233008 entity.

The MaintenanceIssueCategoryCatalogue 233008 entity has a cardinality of zero or n 233010 meaning that for each instance of the MaintenanceIssueCategoryCatalogueSimpleByProfileMaintenanceRequestTypeCodeResponseMessage_sync 233002 entity there may be one or more MaintenanceIssueCategoryCatalogue 233008 entities. The MaintenanceIssueCategory- Catalogue 233008 entity includes various attributes, namely ID 233012, MaintenanceIssueCategoryTypeCode 233018, MaintenanceIssueCategoryTypeName 233024 and Name 233030.

The ID 233012 attribute is a MaintenanceIssueCategoryCatalogueID 233016 datatype. The ID 233012 attribute has a cardinality of one 233014 meaning that for each instance of the MaintenanceIssueCategoryCatalogue 233008 entity there is one ID 233012 attribute.

The MaintenanceIssueCategoryTypeCode 233018 attribute is a MaintenanceIssueCategoryCatalogueTypeCode 233022 datatype. The MaintenanceIssueCategoryTypeCode 233018 attribute has a cardinality of one 233020 meaning that for each instance of the MaintenanceIssueCategoryCatalogue 233008 entity there is one MaintenanceIssueCategoryTypeCode 233018 attribute.

The MaintenanceIssueCategoryTypeName 233024 attribute is a MEDIUM_Name(qualifier:CategoryType) 233028 datatype. The MaintenanceIssueCategoryTypeName 233024 attribute has a cardinality of zero or one 233026 meaning that for each instance of the MaintenanceIssueCategoryCatalogue 233008 entity there may be one MaintenanceIssueCategoryTypeName 233024 attribute.

The Name 233030 attribute is a MEDIUM_Name(qualifier:Catalogue) 233034 datatype. The Name 233030 attribute has a cardinality of zero or one 233032 meaning that for each instance of the MaintenanceIssueCategoryCatalogue 233008 entity there may be one Name 233030 attribute.

The Log 233036 package is a Log 233044 datatype. The Log 233036 package includes a Log 233040 entity.

The Log 233040 entity has a cardinality of one 233042 meaning that for each instance of the MaintenanceIssueCategoryCatalogueSimpleByProfileMaintenanceRequestTypeCodeResponseMessage_sync 233002 entity there is one Log 233040 entity.

MaintenanceIssueCategoryCatalogue Package

The MaintenanceIssueCategoryCatalogue package groups the maintenance issue category catalogue information. It has the entity MaintenanceIssueCategoryCatalogue.

MaintenanceIssueCategoryCatalogue

A MaintenanceIssueCategoryCatalogue is a hierarchically structured catalogue of categories, which classify maintenance-related issues for a particular maintenance aspect. A MaintenanceIssueCategoryCatalogueID is an identifier for a catalog of categories for maintenance-related issues. A MaintenanceIssueCategoryCatalogueMaintenanceIssueCategoryTypeCode is the coded representation of the type of a category of a catalogue for maintenance-related issues. All categories of a catalogue may have the same category type code. MaintenanceIssueCategoryCatalogueTypeName, which can optionally be included, is the language dependent name of the maintenance issue category catalogue type code. MaintenanceIssueCategoryCatalogueName, which can optionally be included, is a language dependent name of the maintenance issue category catalogue.

Log Package

A Log package groups the error messages used for user interaction. It has the entity Log.

Log

A Log is a sequence of messages that result when an application executes a task.

Message Data Type

The message data type MaintenanceIssueCategoryCatalogueCategoryByIDQueryMessage_sync has the Selection for the business document MaintenanceIssueCategoryCatalogueCategory. FIGS. 230-1 through 230-2 show a MaintenanceIssueCategoryCatalogueCategoryByIDQueryMessage_sync 230000 package. The MaintenanceIssueCategoryCatalogueCategoryByIDQueryMessage_sync 230000 package is a MaintenanceIssueCategoryCatalogueCategoryByIDQueryMessage_sync 230004 datatype. The MaintenanceIssueCategoryCatalogueCategoryByIDQueryMessage_sync 230000 package includes a MaintenanceIssueCategoryCatalogueCategoryByIDQueryMessage_sync 230002 entity. The MaintenanceIssueCategoryCatalogueCategoryByIDQueryMessage_sync 230000 package includes a Selection 230006 package.

The Selection 230006 package is a MaintenanceIssueCategoryCatalogueSelectionByID 230012 datatype. The Selection 230006 package includes a MaintenanceIssueCategoryCatalogueCategorySelectionByID 230008 entity.

The MaintenanceIssueCategoryCatalogueCategorySelectionByID 230008 entity has a cardinality of one 230010 meaning that for each instance of the MaintenanceIssueCategoryCatalogueCategoryByIDQueryMessage_sync 230002 entity there is one MaintenanceIssueCategoryCatalogueCategorySelectionByID 230008 entity. The MaintenanceIssueCategoryCatalogueCategorySelectionByID 230008 entity includes various attributes, namely ID 230014, CategoryParentMaintenanceIssueCategoryID 230020, ProfileIssueCategoryFilterCode 230026 and LanguageCode 230032.

The ID 230014 attribute is a MaintenanceIssueCategoryCatalogueID 230018 datatype. The ID 230014 attribute has a cardinality of one 230016 meaning that for each instance of the MaintenanceIssueCategoryCatalogueCategorySelectionByID 230008 entity there is one ID 230014 attribute.

The CategoryParentMaintenanceIssueCategoryID 230020 attribute is a MaintenanceIssueCategoryID(qualifier:Parent) 230024 datatype. The CategoryParentMaintenanceIssueCategoryID 230020 attribute has a cardinality of zero or one 230022 meaning that for each instance of the MaintenanceIssueCategoryCatalogueCategorySelectionByID 230008 entity there may be one CategoryParentMaintenanceIssueCategoryID 230020 attribute.

The ProfileIssueCategoryFilterCode 230026 attribute is an IssueCategoryFilterCode 230030 datatype. The ProfileIssueCategoryFilterCode 230026 attribute has a cardinality of zero or one 230028 meaning that for each instance of the MaintenanceIssueCategoryCatalogueCategorySelectionByID 230008 entity there may be one ProfileIssueCategoryFilterCode 230026 attribute.

The LanguageCode 230032 attribute is a LanguageCode 230036 datatype. The LanguageCode 230032 attribute has a cardinality of zero or one 230034 meaning that for each instance of the MaintenanceIssueCategoryCatalogueCategorySelectionByID 230008 entity there may be one LanguageCode 230032 attribute.

Selection Package

The Selection package collects the selection criteria for MaintenanceIssueCategoryCatalogueCategory. It has the entity MaintenanceIssueCategoryCatalogueCategorySelectionByID.

MaintenanceIssueCategoryCatalogueCategorySelectionByID

MaintenanceIssueCategoryCatalogueCategorySelectionByID specifies selection criteria to select a MaintenanceIssueCategoryCatalogueCategory by MaintenanceIssueCategoryCatalogueID. A MaintenanceIssueCategoryCatalogueID is an identifier for a catalog of categories for maintenance-related issues. A MaintenanceIssueCategoryCatalogueProfileIssueCategoryFilterCode, which can optionally be included, is the coded representation of issue category filter codes for maintenance-related categories. A LanguageCode, which can optionally be included, is the encoded representation of the default language of the catalogue related name(s) and description(s). If no language code is given the system language will be used as default.

Message Data Type

The message data type MaintenanceIssueCategoryCatalogueCategoryByIDResponseMessage_sync has the MaintenanceIssueCategoryCatalogue included in the business document and the Log. It has the packages MaintenanceIssueCategoryCatalogue and Log. FIGS. 231-1 through 231-2 show a MaintenanceIssueCategoryCatalogueCategoryByIDResponseMessage_sync 231000 package. The MaintenanceIssueCategoryCatalogueCategoryByIDResponseMessage_sync 231000 package is a MaintenanceIssueCategoryCatalogueMessage_sync 231004 datatype. The MaintenanceIssueCategoryCatalogueCategoryByIDResponseMessage_sync 231000 package includes a MaintenanceIssueCategoryCatalogueCategoryByIDResponseMessage_sync 231002 entity. The MaintenanceIssueCategoryCatalogueCategoryByIDResponseMessage_sync 231000 package includes various packages, namely MaintenanceIssueCategoryCatalogue 231006 and Log 231066.

The MaintenanceIssueCategoryCatalogue 231006 package includes a MaintenanceIssueCategoryCatalogue 231008 entity. The MaintenanceIssueCategoryCatalogue 231006 package includes a Category 231036 package.

The MaintenanceIssueCategoryCatalogue 231008 entity has a cardinality of zero or one 231010 meaning that for each instance of the MaintenanceIssueCategoryCatalogueCategoryByIDResponseMessage_sync 231002 entity there may be one MaintenanceIssueCategoryCatalogue 231008 entity. The MaintenanceIssueCategoryCatalogue 231008 entity includes various attributes, namely ID 231012, MaintenanceIssueCategoryTypeCode 231018, Name 231024 and MaintenanceIssueCategoryTypeName 231030.

The ID 231012 attribute is a MaintenanceIssueCategoryCatalogueID 231016 datatype. The ID 231012 attribute has a cardinality of one 231014 meaning that for each instance of the MaintenanceIssueCategoryCatalogue 231008 entity there is one ID 231012 attribute.

The MaintenanceIssueCategoryTypeCode 231018 attribute is a MaintenanceIssueCategoryTypeCode 231022 datatype. The MaintenanceIssueCategoryTypeCode 231018 attribute has a cardinality of one 231020 meaning that for each instance of the MaintenanceIssueCategoryCatalogue 231008 entity there is one MaintenanceIssueCategoryTypeCode 231018 attribute.

The Name 231024 attribute is a MEDIUM_Name(Qualifier:Catalogue) 231028 datatype. The Name 231024 attribute has a cardinality of zero or one 231026 meaning that for each instance of the MaintenanceIssueCategoryCatalogue 231008 entity there may be one Name 231024 attribute.

The MaintenanceIssueCategoryTypeName 231030 attribute is a MEDIUM_Name(Qualifier:CategoryType) 231034 datatype. The MaintenanceIssueCategoryTypeName 231030 attribute has a cardinality of zero or one 231032 meaning that for each instance of the MaintenanceIssueCategoryCatalogue 231008 entity there may be one MaintenanceIssueCategoryTypeName 231030 attribute.

The Category 231036 package includes a Category 231038 entity.

The Category 231038 entity has a cardinality of zero or n 231040 meaning that for each instance of the MaintenanceIssueCategoryCatalogue 231008 entity there may be one or more Category 231038 entities. The Category 231038 entity includes various attributes, namely MaintenanceIssueCategoryID 231042, ParentMaintenanceIssueCategoryID 231048, MaintenanceIssueCategoryName 231054 and MaintenanceIssueCategoryDescription 231060.

The MaintenanceIssueCategoryID 231042 attribute is a MaintenanceIssueCategoryID 231046 datatype. The MaintenanceIssueCategoryID 231042 attribute has a cardinality of one 231044 meaning that for each instance of the Category 231038 entity there is one MaintenanceIssueCategoryID 231042 attribute.

The ParentMaintenanceIssueCategoryID 231048 attribute is a MaintenanceIssueCategoryID(qualifier:Parent) 231052 datatype. The ParentMaintenanceIssueCategoryID 231048 attribute has a cardinality of zero or one 231050 meaning that for each instance of the Category 231038 entity there may be one ParentMaintenanceIssueCategoryID 231048 attribute.

The MaintenanceIssueCategoryName 231054 attribute is a MEDIUM_Name(qualifier:Category) 231058 datatype. The MaintenanceIssueCategoryName 231054 attribute has a cardinality of zero or one 231056 meaning that for each instance of the Category 231038 entity there may be one MaintenanceIssueCategoryName 231054 attribute.

The MaintenanceIssueCategoryDescription 231060 attribute is a MEDIUM_Description(qualifier:Category) 231064 datatype. The MaintenanceIssueCategoryDescription 231060 attribute has a cardinality of zero or one 231062 meaning that for each instance of the Category 231038 entity there may be one MaintenanceIssueCategoryDescription 231060 attribute.

The Log 231066 package is a Log 231072 datatype. The Log 231066 package includes a Log 231068 entity.

The Log 231068 entity has a cardinality of one 231070 meaning that for each instance of the MaintenanceIssueCategoryCatalogueCategoryByIDResponseMessage_sync 231002 entity there is one Log 231068 entity.

MaintenanceIssueCategoryCatalogue Package

The MaintenanceIssueCategoryCatalogue package groups the MaintenanceIssueCategoryCatalogue information. It has the entity MaintenanceIssueCategoryCatalogue. It has the package Category.

A MaintenanceIssueCategoryCatalogue is a hierarchically structured catalogue of categories, which classify maintenance-related issues for a particular maintenance aspect. MaintenanceIssueCategoryCatalogueID is an identifier for a catalog of categories for maintenance-related issues.

MaintenanceIssueCategoryCatalogueMaintenanceIssueCategoryTypeCode is a coded representation of the type of a catalogue for maintenance-related issues. MaintenanceIssueCategoryCatalogueTypeName, which can optionally be included, is a language dependent name of the maintenance issue category catalogue type code. MaintenanceIssueCategoryCatalogueName, which can optionally be included, is a language dependent name of the maintenance issue category catalogue.

Category Package

A Category package groups together all categories involved in a specific MaintenanceIssueCategoryCatalogue.

Category

A category is a characteristic of a specific issue that categorizes business events according to an objective or a subjective point of view. MaintenanceIssueCategoryID identifies a catalog of categories for maintenance-related issues. ParentMaintenanceIssueCategoryID, which can optionally be included, is a maintenance-related issue category that is directly super ordinate to a particular category. MaintenanceIssueCategoryName, which can optionally be included, is a language dependent name of the maintenance issue category catalogue. MaintenanceIssueCategoryDescription, which can optionally be included, is a natural-language representation of the properties of the maintenance issue category catalogue category.

Log Package

A Log package groups the error messages used for user interaction.

Log

A Log is a sequence of messages that result when an application executes a task.

MaintenanceOrder Interfaces

Maintenance Order Interfaces provide the service operations required for communication between client and maintenance order application. Maintenance Orders are used in the maintenance work order cycle to describe the work to be done. It is used to create capacity requirements, create reservations, request external work and/or material, and collect all costs.

Message Choreography

The message choreography of FIG. 234 describes a possible logical sequence of messages that can be used to realize a maintenance order business scenario. For the release of a maintenance order, the pattern "request confirmation" can facilitate in determining, from a business perspective, whether the order was really successfully in EAM (i.e., for security seasons).

A MaintenanceOrderCreateRequest is a request to Enterprise Asset Management to create a new maintenance order. The structure of the message type MaintenanceOrderCreateRequest is specified by the message data type MaintenanceOrderCreateRequestMessage, which is derived from the message data type MaintenanceOrderMessage.

A MaintenanceOrderCreateConfirmation is the confirmation or rejection to a request to create a new maintenance order. It is the response Enterprise Asset Management to a MaintenanceOrderCreateRequest. The structure of the message type MaintenanceOrderCreateConfirmation is specified by the message data type MaintenanceOrderCreateConfirmationMessage, which is derived from the message data type MaintenanceOrderMessage.

A MaintenanceOrderCreateCheckQuery is an inquiry to Enterprise Asset Management to check the creation of a new maintenance order. The structure of the message type MaintenanceOrderCreateCheckQuery is specified by the message data type MaintenanceOrderCreateCheckQueryMessage, which is derived from the message data type MaintenanceOrderMessage.

A MaintenanceOrderCreateCheckResponse is the response to an inquiry to check a creation of a new maintenance order. It is the response of Enterprise Asset Management to a MaintenanceOrderCreateCheckQuery. The structure of the message type MaintenanceOrderCreateCheckResponse is specified by the message data type MaintenanceOrderCreateCheckResponseMessage, which is derived from the message data type MaintenanceOrderMessage.

A MaintenanceOrderChangeRequest is a request to Enterprise Asset Management to change a maintenance order. The structure of the message type MaintenanceOrderChangeRequest is specified by the message data type MaintenanceOrderChangeRequestMessage, which is derived from the message data type MaintenanceOrderMessage.

A MaintenanceOrderChangeConfirmation is the confirmation or rejection to a request to change a maintenance order. It is the response of Enterprise Asset Management to a MaintenanceOrderChangeRequest. The structure of the message type MaintenanceOrderChangeConfirmation is specified by the message data type MaintenanceOrderChangeConfirmationMessage, which is derived from the message data type MaintenanceOrderMessage.

A MaintenanceOrderChangeCheckQuery is an inquiry to Enterprise Asset Management to check the change of a maintenance order. The structure of the message type MaintenanceOrderChangeCheckQuery is specified by the message data type MaintenanceOrderChangeCheckQueryMessage, which is derived from the message data type MaintenanceOrderMessage.

A MaintenanceOrderChangeCheckResponse is the response to an inquiry to check the change of a maintenance order. It is the response of Enterprise Asset Management to a MaintenanceOrderChangeCheckQuery. The structure of the message type MaintenanceOrderChangeCheckResponse is specified by the message data type MaintenanceOrderChangeCheckResponseMessage, which is derived from the message data type MaintenanceOrderMessage.

A MaintenanceOrderByIDQuery is an inquiry to Enterprise Asset Management to return the detailed information of a maintenance order. The structure of the message type MaintenanceOrderByIDQuery is specified by the message data type MaintenanceOrderByIDQueryMessage, which is derived from the message data type MaintenanceOrderMessage.

A MaintenanceOrderByIDResponse is the response to an inquiry and contains detailed information of a single maintenance order. It is the response of Enterprise Asset Management to a MaintenanceOrderByIDQuery. The structure of the message type MaintenanceOrderByIDResponse is specified by the message data type, MaintenanceOrderByIDResponseMessage, which is derived from the message data type MaintenanceOrderMessage.

A MaintenanceOrderReleaseRequest is a request to Enterprise Asset Management to release a maintenance order. The structure of the message type MaintenanceOrderReleaseRequest is specified by the message data type MaintenanceOrderReleaseRequestMessage, which is derived from the message data type MaintenanceOrderStatusChangeMessage.

A MaintenanceOrderReleaseConfirmation is the confirmation or rejection to a request to release a maintenance order. It is the response of Enterprise Asset Management to MaintenanceOrderReleaseRequest. The structure of the message type MaintenanceOrderReleaseConfirmation is specified by the message data type MaintenanceOrderReleaseConfirmationMessage, which is derived from the message data type MaintenanceOrderStatusChangeMessage.

A MaintenanceOrderReleaseCheckQuery is an inquiry to Enterprise Asset Management to check the release of a maintenance order. The structure of the message type MaintenanceOrderReleaseCheckQuery is specified by the message data type MaintenanceOrderReleaseCheckQueryMessage, which is derived from the message data type MaintenanceOrderStatusChangeMessage.

A MaintenanceOrderReleaseCheckResponse is the response to an inquiry to check the release of a maintenance order. It is the response of Enterprise Asset Management to MaintenanceOrderReleaseCheckQuery. The structure of the message type MaintenanceOrderReleaseCheckQuery is specified by the message data type MaintenanceOrderReleaseCheckQueryMessage, which is derived from the message data type MaintenanceOrderStatusChangeMessage.

A MaintenanceOrderTechnicalCloseRequest is a request to Enterprise Asset Management to technically close a maintenance order. The structure of the message type MaintenanceOrderTechnicalCloseRequest is specified by the message data type MaintenanceOrderTechnicalCloseRequestMessage, which is derived from the message data type MaintenanceOrderStatusChangeMessage.

A MaintenanceOrderTechnicalCloseConfirmation is the confirmation or rejection to a request to technically close a maintenance order. It is the response of Enterprise Asset Management to MaintenanceOrderTechnicalCloseRequest. The structure of the message type MaintenanceOrderTechnicalCloseConfirmation is specified by the message data type MaintenanceOrderTechnicalCloseConfirmationMessage, which is derived from the message data type MaintenanceOrderStatusChangeMessage.

A MaintenanceOrderTechnicalCloseCheckQuery is an inquiry to Enterprise Asset Management to check the technical close of a maintenance order. The structure of the message type MaintenanceOrderTechnicalCloseCheckQuery is specified by the message data type MaintenanceOrderTechnicalCloseCheckQueryMessage, which is derived from the message data type MaintenanceOrderStatusChangeMessage.

A MaintenanceOrderTechnicalCloseCheckResponse is the response to an inquiry to check the technical close of a maintenance order. It is the response of Enterprise Asset Management to MaintenanceOrderTechnicalCloseCheckQuery. The structure of the message type MaintenanceOrderTechnicalCloseCheckResponse is specified by the message data type MaintenanceOrderTechnicalCloseCheckResponseMessage, which is derived from the message data type MaintenanceOrderStatusChangeMessage.

A MaintenanceOrderSimpleQuery is an inquiry to Enterprise Asset Management to return a list of maintenance orders for certain selection criteria. The structure of the message type MaintenanceOrderSimpleQuery is specified by the message data type MaintenanceOrderSimpleByBasicDataQueryMessage.

A MaintenanceOrderSimpleResponse is the response to the inquiry of MaintenanceOrderByIDQuery and contains simple information of several maintenance orders matching the selection criteria of the inquiry. The structure of the message type MaintenanceOrderSimpleResponse is specified by the message data type MaintenanceOrderSimpleResponseMessage, which is derived from the message data type MaintenanceOrderMessage.

A MaintenanceOrderAllowedMaintenancePlannerGroupByMaintenancePlanningPlantQuery_sync is an inquiry to Enterprise Asset Management to find allowed maintenance planner groups for a specified maintenance planning plant. The structure of the message type MaintenanceOrderAllowedMaintenancePlannerGroupByMaintenancePlanningPlantQuery_sync is specified by the message data type MaintenanceOrderAllowedMaintenancePlannerGroupByMaintenancePlanningPlantQuery Message_sync.

A MaintenanceOrderAllowedMaintenancePlannerGroupByMaintenancePlanningPlantResponse_sync is a response from Enterprise Asset Management to a MaintenanceOrder AllowedMaintenance PlannerGroupByMaintenancePlanningPlantQuery_sync. The structure of the message type MaintenanceOrderAllowedMaintenancePlannerGroupByMaintenancePlanningPlantResponse_sync is specified by the message data type Maintenance OrderAllowedMaintenancePlannerGroupBy MaintenancePlanningPlantResponseMessage_sync.

A Maintenance OrderAllowedUserStatusByTypeQuery_sync is an inquiry to Enterprise Asset Management to find allowed statuses for a specified maintenance order. The structure of the message type MaintenanceOrderAllowedUserStatusByTypeQuery_sync is specified by the message data type MaintenanceOrderAllowedUserStatusByTypeQueryMessage_sync.

A MaintenanceOrderAllowedUserStatusByTypeResponse_sync a response from Enterprise Asset Management to a MaintenanceOrderAllowedUserStatusByTypeQuery_sync. The structure of the message type MaintenanceOrderAllowedUserStatusByTypeResponse_sync is specified by the message data type MaintenanceOrderAllowedUserStatusByTypeResponseMessage_sync.

The following messages shall be delivered to deal with maintenance orders. The message type MaintenanceOrderCreateRequest is sent from a service consumer to Enterprise Asset Management (EAM) to create a new maintenance order. The message type MaintenanceOrderCreateConfirmation is sent from Enterprise Asset Management as a response to a MaintenanceOrderCreateRequest message to confirm the new maintenance order. The message type MaintenanceOrderCreateCheckQuery is sent from a service consumer to Enterprise Asset Management to check the creation of a new maintenance order. The message type MaintenanceOrderCreateCheckResponse is sent from Enterprise Asset Management as a response to a MaintenanceOrderCreateCheckQuery message. The message type MaintenanceOrderChangeRequest is sent from a service consumer Enterprise Asset Management to change an existing maintenance order. The message type MaintenanceOrderChangeConfirmation is sent from Enterprise Asset Management as a response to a MaintenanceOrderChangeRequest message to confirm the change of the maintenance order. The message type MaintenanceOrderChangeCheckQuery is sent from a service consumer to Enterprise Asset Management to check a change of an existing maintenance order. The message type MaintenanceOrderChangeCheckResponse is sent from Enterprise Asset Management as a response to a MaintenanceOrderChangeCheckQuery message. The message type MaintenanceOrderByIDQuery is used to query all information about a single maintenance order by a consumer from Enterprise Asset Management. The message type MaintenanceOrderByIDResponse is used to carry out the response to a MaintenanceOrderByIDQuery message. The message type MaintenanceOrderReleaseRequest is sent to Enterprise Asset Management to release a maintenance order. The message type MaintenanceOrderReleaseConfirmation is sent from Enterprise Asset Management as response to message type MaintenanceOrderReleaseRequest. The message type MaintenanceOrderReleaseCheckQuery is sent to Enterprise Asset Management to check the release of a maintenance order. The message type MaintenanceOrderReleaseCheckResponse is sent from Enterprise Asset Management as response to message type MaintenanceOrderReleaseCheckQuery. The message type MaintenanceOrderTechnicalCloseRequest is sent to Enterprise Asset Management to technically close a maintenance order. The message type MaintenanceOrderTechnicalCloseConfirmation is sent from Enterprise Asset Management as response to message type MaintenanceOrderTechnicalCloseRequest. The message type MaintenanceOrderTechnicalCloseCheckQuery is sent to Enterprise Asset Management to check the technical close of a maintenance order. The message type MaintenanceOrderTechnicalCloseCheckResponse is sent from Enterprise Asset Management as response to message type MaintenanceOrderTechnicalCloseCheckQuery. The message type MaintenanceOrderSimpleQuery is sent by a service consumer to Enterprise Asset Management to query a list of maintenance orders for certain select criteria. The message type MaintenanceOrderSimpleResponse is sent by Enterprise Asset Management to carry out the queried information. The message type MaintenanceOrderAllowedMaintenancePlannerGroupByMaintenancePlanningPlantQuery_sync is sent by a service consumer to Enterprise Asset Management to find allowed maintenance planner groups for a specified maintenance plant. The message type MaintenanceOrderAllowedMaintenancePlannerGroupByMaintenancePlanningPlantResponse_sync is sent by Enterprise Asset Management as a response to MaintenanceOrderAllowedMaintenancePlannerGroupByMaintenancePlanningPlantQuery_sync. The message type MaintenanceOrderAllowedUserStatusByTypeQuery_sync is sent by a service consumer to Enterprise Asset Management to find allowed status for a specified maintenance order. The message type MaintenanceOrderAllowedAllowedUserStatusByTypeResponse_sync is sent by Enterprise Asset Management as a response to MaintenanceOrderAllowedUserStatusByTypeQuery_sync.

For example, a "Maintenance Processing Composite Application" system 234002 can request to create a new maintenance order using the MaintenanceOrderCreateRequest message 234006 as shown, for example, in FIG. 239. An "Enterprise Asset Management" system 234004 can confirm the new maintenance order using the MaintenanceOrderCreateConfirmation message 234008. The "Maintenance Processing Composite Application" system 234002 can check the creation of a new maintenance order using the MaintenanceOrderCreateCheckQuery message 234010. The "Enterprise Asset Management" system 234004 can respond to the query using the MaintenanceOrderCreateCheckResponse message 234012. The "Maintenance Processing Composite Application" system 234002 can change an existing maintenance order using the MaintenanceOrderChangeRequest message 234014 as shown, for example, in FIG. 241. The "Enterprise Asset Management" system 234004 can confirm the change using the MaintenanceOrderChangeConfirmation message 234016. The "Maintenance Processing Composite Application" system 234002 can check a change of an existing maintenance order using the MaintenanceOrderChangeCheckQuery message 234018. The "Enterprise Asset Management" system 234004 can respond to the check using the MaintenanceOrderChangeCheckResponse message 234020. The "Maintenance Processing Composite Application" system 234002 can query all information about a single maintenance order by a consumer using the MaintenanceOrderByIDQuery message 234022. The "Enterprise Asset Management" system 234004 can respond to the query using the MaintenanceOrderByIDResponse message 234024. The "Maintenance Processing Composite Application" system 234002 can request to release a maintenance order using the MaintenanceOrderReleaseRequest message 234026. The "Enterprise Asset Management" system 234004 can respond to the request using the MaintenanceOrderReleaseConfirmation message 234028. The "Maintenance Processing Composite Application" system 234002 can check the release of a maintenance order using the MaintenanceOrderReleaseCheckQuery message 234030. The "Enterprise Asset Management" system 234004 can respond to the request using the MaintenanceOrderReleaseCheckResponse message 234032. The "Maintenance Processing Composite Application" system 234002 can technically close a maintenance order using the MaintenanceOrderTechnicalCloseRequest message 234034. The "Enterprise Asset Management" system 234004 can respond to the request using the MaintenanceOrderTechnicalCloseConfirmation message 234036. The "Maintenance Processing Composite Application" system 234002 can check the technical close of a maintenance order using the MaintenanceOrderTechnicalCloseCheckQuery message 234038. The "Enterprise Asset Management" system 234004 can respond to the query using the MaintenanceOrderTechnicalCloseCheckResponse message 234040 234. The "Maintenance Processing Composite Application" system 234002 can query a list of maintenance orders for certain select criteria using the MaintenanceOrderSimpleQuery message 234042 as shown, for example, in FIG. 240. The "Enterprise Asset Management" system 234004 can respond to the query using the MaintenanceOrderSimpleResponse message 234044. The "Maintenance Processing Composite Application" system 234002 can find allowed maintenance planner groups for a specified maintenance plant using the MaintenanceOrderAllowedMaintenancePlannerGroupByMaintenancePlanningPlantQuery_sync message 234046, for example, in FIG. 235. The "Enterprise Asset Management" system 234004 can respond to the query using the MaintenanceOrderAllowedMaintenancePlannerGroupByMaintenancePlanningPlantResponse_sync message 234048 as shown, for example, in FIG. 236. The "Maintenance Processing Composite Application" system 234002 can find allowed status for a specified maintenance order using the MaintenanceOrderAllowedUserStatusByTypeQuery_sync message 234050 as shown, for example, in FIG. 237. The "Enterprise Asset Management" system 234004 can respond to the query using the MaintenanceOrderAllowedAllowedUserStatusByTypeResponse_sync message 234052 as shown, for example, in FIG. 238.

Message Data Type

The message data type MaintenanceOrderMessage contains the maintenance order included in the business document and the business information that is relevant for sending a business document in a message. The message data type MaintenanceOrderMessage is used as an abstract maximal message data type, which unifies all packages and entities for the following concrete message data types: MaintenanceOrderCreateRequestMessage, MaintenanceOrderCreateConfirmationMessage, MaintenanceOrderCreateCheckQueryMessage, MaintenanceOrderCreateCheckResponseMessage, MaintenanceOrderChangeRequestMessage, MaintenanceOrderChangeConfirmationMessage, MaintenanceOrderChangeCheckQueryMessage, MaintenanceOrderChangeCheckResponseMessage, MaintenanceOrderByIDQueryMessage, MaintenanceOrderByIDResponseMessage, and MaintenanceOrderSimpleByBasicDataResponseMessage. FIG. 249 shows a MaintenanceOrderMessage 249000 package. The MaintenanceOrderMessage 249000 package is a <MessageDataType> 249004 datatype. The MaintenanceOrderMessage 249000 package includes a MaintenanceOrderMessage 249002 entity. The MaintenanceOrderMessage 249000 package includes various packages, namely MessageHeader 249006, MaintenanceOrder 249028 and Log 249040.

The MessageHeader 249006 package is a BusinessDocumentMessageHeader 249012 datatype. The MessageHeader 249006 package includes a MessageHeader 249008 entity.

The MessageHeader 249008 entity has a cardinality of one 249010 meaning that for each instance of the MaintenanceOrderMessage 249002 entity there is one MessageHeader 249008 entity. The MessageHeader 249008 entity includes various attributes, namely ID 249014 and CreationDateTime 249020.

The ID 249014 attribute is a BusinessDocumentMessageID 249018 datatype. The ID 249014 attribute has a cardinality of one 249016 meaning that for each instance of the MessageHeader 249008 entity there is one ID 249014 attribute.

The CreationDateTime 249020 attribute is a DateTime 249024 datatype. The CreationDateTime 249020 attribute has a cardinality of one 249022 meaning that for each instance of the MessageHeader 249008 entity there is one CreationDateTime 249020 attribute.

The MaintenanceOrder 249028 package includes a MaintenanceOrder 249030 entity.

The MaintenanceOrder 249030 entity has a cardinality of zero or one 249032 meaning that for each instance of the MaintenanceOrderMessage 249002 entity there may be one MaintenanceOrder 249030 entity. The MaintenanceOrder 249030 entity includes an ID 249034 attribute.

The ID 249034 attribute is a MaintenanceOrderID 249038 datatype. The ID 249034 attribute has a cardinality of one 249036 meaning that for each instance of the MaintenanceOrder 249030 entity there is one ID 249034 attribute.

The Log 249040 package is a Log 249046 datatype. The Log 249040 package includes a Log 249042 entity.

The Log 249042 entity has a cardinality of one 249044 meaning that for each instance of the MaintenanceOrderMessage 249002 entity there is one Log 249042 entity.

MessageHeader Package

A MessageHeader package groups the business information that is relevant for sending a business document in a message.

MessageHeader

A MessageHeader groups business information from the perspective of the sending application such as information to identify the business document in a message, information about the sender, and (possibly) information about the recipient.

SenderParty

A SenderParty is the party responsible for sending a business document at business application level. The SenderParty is of type GDT: BusinessDocumentMessageHeaderParty.

RecipientParty

A RecipientParty is the party responsible for receiving a business document at business application level. The RecipientParty is of type GDT: BusinessDocumentMessageHeaderParty.

MaintenanceOrder Package

A maintenance order is a requirement to execute a maintenance task on a technical object for a specific deadline. ID is the unique identifier of a MaintenanceOrder and is used for derived messages MaintenanceOrderChangeRequest and MaintenanceOrderByIDQuery. The TypeCode is the coded representation of the type of a MaintenanceOrder and is used for derived message MaintenanceOrderCreateRequest. The TypeName is the name of the type of the MaintenanceOrder. A MaintenancePlanningPlantID is the unique identifier of the Plant responsible for planning and supervising of execution of maintenance tasks and is used for derived message MaintenanceOrderCreateRequest and MaintenanceOrderCreateCheckQuery. MaintenancePlanningPlantName is the name of the MaintenancePlanningPlant. AccountingBusinessAreaCode is the coded representation of the AccountingBusinessArea. WorkCentreID is the unique identifier of the WorkCentre responsible for execution of maintenance tasks. WorkCentreName is the name of the WorkCentre. WorkCentrePlantID is the unique identifier of the plant of the WorkCentre. WorkCentrePlantName is the name of the WorkCentrePlant. MaintenancePlannerGroupCode is the coded representation of the PlannerGroup responsible for planning and supervision of execution of maintenance tasks. InstallationPointID is the unique identifier of an InstallationPoint. IndividualMaterialID is the unique identifier of an IndividualMaterial. MaterialID is the unique identifier of a Material. A SerialID is the unique identifier for an individual item that is assigned in the context of production. An “individual item” is the instance of a product. For a MaintenanceOrder the SerialID is unique in context of MaterialID. ImportanceCode is the coded representation of the importance of the MaintenanceOrder. Description is the description of a MaintenanceOrder. The languageCode is not supported in this message. TextCollection is the collection of all textual descriptions of a MaintenanceOrder. MaintenanceRequestID is the unique Identifier of the MaintenanceRequest. RequestedExecutionPeriod refers to the start and end date and time as requested from maintenance processor. ScheduledExecutionPeriod refers to start and end date and time as calculated during scheduling. ActualExecutionPeriod refers to the start and end date and time as result of the confirmations done for operations. SystemAdministrativeData of the MaintenanceOrder. This data comprises system user and change date and times. PlannedTotalAmount is the planned total amount of the MaintenanceOrder. ActualTotalAmount is the actual total amount of the MaintenanceOrder. EstimatedTotalAmount is the estimated total amount of the MaintenanceOrder. StatusObject describes the processing status of the MaintenanceOrder.

Operation Package

An Operation Package groups the entities required for executing the tasks of the maintenance order.

Operation

An operation is a self-contained part of a process in a logistics process description that is normally completely executed within a predefined time on one or more resources that represent the main resources. It further can describe in the operation text how the task is to be performed.

ActionCode refers to a coded representation of an instruction to the recipient of a message telling it how to process a transmitted element. It determines if the MaintenanceOrderOperation has to be created (Code 01), changed (Code 02), or deleted (Code 03). Other codes are not allowed. It is used for derived messages MaintenanceOrderChangeRequest and MaintenanceOrderChangeCheckQuery. ID refers to a unique identifier of an operation. It is unique within a MaintenanceOrder. It is used for derived messages MaintenanceOrderCreateRequest, MaintenanceOrderChangeRequest and MaintenanceOrderByIDQuery. ActivityID refers to a unique identifier of an activity in an operation. ControlProfileCode refers to the coded representation of the profile, which combines several controls of business transactions within an operation. WorkCentreID refers to a unique identifier of a WorkCentre. WorkCentreName refers to the name of the WorkCentre. WorkCentrePlantID refers to the unique identifier of the plant of the WorkCentre. WorkCentrePlantName refers to is the name of the WorkCentrePlant. Description refers to the description of the operation. The languageCode is not supported in this message. TextCollection refers to the collection of all textual descriptions of an operation. CalculateOperationWorkloadComponentCode refers to a coded representation of the component of the operation workload to be calculated. ResourceClassID refers to a unique identifier of a resource class. WorkAgreementID refers to a unique identifier of a work agreement which is assigned to the operation. EmployeePersonFormattedName refers to the PersonFormattedName of the employee attached to the WorkAgreement. PlannedDurationQuantity refers to a working time planned for the execution of an operation without non-working times, such as breaks. PlannedWorkQuantity refers to a quantity of planned work to be performed during operation processing. EarliestExecutionPeriod refers to the earliest start and end date and time calculated during scheduling. LatestExecutionPeriod refers to the latest start and end date and time calculated during scheduling. ActualWorkQuantity refers to a quantity of actual work performed during operation processing. ActualExecutionPeriod refers to the actual start and end date and time determined by confirmation done for operation. ForecastEndDateTime refers to a forecast end date and time of operation. ForecastWorkQuantity refers to a forecast WorkQuantity of operation. StatusObject refers to the processing status of the Operation.

MaterialInput

A MaterialInput is a material that shall enter the operation in a predefined quantity and location. This material can be a spare part or a repairable spare or describe an activity.

ActionCode refers to a coded representation of an instruction to the recipient of a message telling it how to process a transmitted element. It determines if the MaterialInput has to be created (Code 01), changed (Code 02), or deleted (Code 03). Other codes are not allowed. It is used for derived messages MaintenanceOrderChangeRequest and MaintenanceOrderChangeCheckQuery. ReservationID refers to a unique Identifier of the Reservation of the MaterialInput. It is used for derived messages MaintenanceOrderChangeRequest and MaintenanceOrderChangeCheckQuery. ReservationItemID refers to a unique Identifier of the ReservationItem of the MaterialInput. It is used for derived messages MaintenanceOrderChangeRequest and MaintenanceOrderByIDQuery. GoodsMovementAllowedIndicator refers to an indicator if GoodsMovement for MaterialInput is allowed. MaterialID refers to a unique identifier of the material of the MaterialInput. PlantID refers to a unique identifier of the Plant the MaterialInput is located. InventoryManagedLocationID refers to an InventoryManagedLocationID is the unique identifier of an InventoryManagedLocation. Description refers to the Description of the MaterialInput. The languageCode is not supported in this message. TextCollection refers to the collection of all textual descriptions of a MaterialInput. LogisticsConfirmationMethodCode refers to a coded representation of the method to be used to confirm the goods movement for MaterialInput. RequirementQuantity refers to a quantity that shall enter the operation. ProcurementEffectivenessConditionCode refers to a coded representation of the condition procurement of MaterialInput gets effective. AllocatedQuantity refers to a quantity that is allocated for MaterialInput. FullfilledQuantity refers to a quantity of MaterialInput that has entered the operation.

Party Package

A Party package groups together all the business parties involved in the MaintenanceOrder.

ProductRecipientParty

A ProductRecipientParty is a party to which goods are delivered or for whom services are provided. ActionCode refers to coded representation of an instruction to the recipient of a message telling it how to process a transmitted element. It determines if the ProductRecipientParty has to be created (Code 01), or deleted (Code 03). Other codes are not allowed. It is used for derived messages MaintenanceOrderChangeRequest and MaintenanceOrderChangeCheckQuery. RecipientPartyID refers to the unique identifier of a ProductRecipientParty. It is used for derived messages MaintenanceOrderChangeRequest and MaintenanceOrderChangeCheckQuery. ProductRecipientName refers to the name of the ProductRecipient.

VendorParty

A VendorParty is a party that delivers goods or provides services.

ActionCode refers to coded representation of an instruction to the recipient of a message telling it how to process a transmitted element. It determines if the VendorParty has to be created (Code 01), or deleted (Code 03). Other codes are not allowed. It is used for derived messages MaintenanceOrderChangeRequest and MaintenanceOrderChangeCheckQuery. VendorPartyID refers to the unique identifier of a VendorParty. It is used for derived messages MaintenanceOrderChangeRequest and MaintenanceOrderChangeCheckQuery. VendorName refers to the name of the Vendor.

ResponsibleEmployee

A ResponsibleEmployee is an employee responsible for processing of the maintenance order.

ActionCode refers to a coded representation of an instruction to the recipient of a message telling it how to process a transmitted element. It determines if the ResponsibleEmployee has to be created (Code 01), or deleted (Code 03). Other codes are not allowed. It is used for derived messages MaintenanceOrderChangeRequest and MaintenanceOrderChangeCheckQuery. ResponsibleEmployeeID refers to the unique identifier of a ResponsibleEmployee. It is used for derived messages MaintenanceOrderChangeRequest and MaintenanceOrderChangeCheckQuery.

ResponsibleEmployeeName refers to the name of the ResponsibleEmployee.

CostSettlementRule Package

A CostSettlementRule Package groups the information required to settle the costs on the order.

CostSettlementRule

A CostSettlementRule defines what proportion of the costs on the maintenance order should be settled to which receiver(s). ActionCode refers to a coded representation of an instruction to the recipient of a message telling it how to process a transmitted element. It determines if the CostSettlementRule has to be created (Code 01), changed (Code 02), or deleted (Code 03). Other codes are not allowed. It is used for derived messages MaintenanceOrderChangeRequest and MaintenanceOrderChangeCheckQuery. OrdinalNumberValue refers to a number that indicates the position of an element in the CostSettlementRule in a linearly ordered set. It is used for derived messages MaintenanceOrderChangeRequest and MaintenanceOrderChangeCheckQuery. ControllingSettlementTypeCode refers to a coded representation of a controlling settlement type. AssignmentPercent refers to a percentage of total costs of MaintenanceOrder assigned to one CostSettlementRule. MasterFixedAssetID refers to the unique identifier of a MasterFixedAsset assigned to the CostSettlementRule. FixedAssetID refers to the unique identifier of a FixedAsset assigned to the settlement rule. InternalOrderID refers to an identifier for an internal order. MaintenanceOrderID refers to an identifier for a maintenance order. CostCentreID refers to the unique identifier of a CostCentre. ProjectNetworkID refers to an identifier for a Project Network. ProjectActivityID refers to an identifier for a Project Activity. ProjectWorkBreakdownStructureElementID refers to an identifier for a Project Work Breakdown Structure Element. GeneralLedgerAccountID refers to a unique identifier of a GeneralLedgerAccount. ValidToFiscalYearID refers to the unique identifier of the FiscalYear until the CostSettlementRule is valid. ValidToAccountingPeriodID refers to the unique identifier of the AccountingPeriod until the CostSettlementRule is valid. ValidFromFiscalYearID refers to the unique identifier of the FiscalYear the validity of the CostSettlementRule starts. ValidFromAccountingPeriodID refers to the unique identifier of the AccountingPeriod the validity of the CostSettlementRule starts.

Log Package

A Log package groups the messages used for user interaction.

Log

A log is a sequence of messages that result when an application executes a task.

Message Data Type

The message data type MaintenanceOrderStatusChangeMessage contains the maintenance order included in the business document and the business information that is relevant for sending a business document in a message. The message data type MaintenanceOrderStatusChangeMessage is used as an abstract maximal message data type, which unifies all packages and entities for the following concrete message data types: MaintenanceOrderReleaseRequestMessage, MaintenanceOrderReleaseConfirmationMessage, MaintenanceOrderReleaseCheckQueryMessage, MaintenanceOrderReleaseCheckResponseMessage, MaintenanceOrderTechnicalCloseRequestMessage, MaintenanceOrderTechnicalCloseConfirmationMessage, MaintenanceOrderTechnicalCloseCheckQueryMessage, and MaintenanceOrderTechnicalCloseCheckResponseMessage. FIG. 246 shows a MaintenanceOrderMessage 246000 package. The MaintenanceOrderMessage 246000 package is a <MessageDataType> 246004 datatype. The MaintenanceOrderMessage 246000 package includes a MaintenanceOrderMessage 246002 entity. The MaintenanceOrderMessage 246000 package includes various packages, namely MessageHeader 246006 and MaintenanceOrder 246028.

The MessageHeader 246006 package is a BusinessDocumentMessageHeader 246012 datatype. The MessageHeader 246006 package includes a MessageHeader 246008 entity.

The MessageHeader 246008 entity has a cardinality of one 246010 meaning that for each instance of the MaintenanceOrderMessage 246002 entity there is one MessageHeader 246008 entity. The MessageHeader 246008 entity includes various attributes, namely ID 246014 and CreationDateTime 246020.

The ID 246014 attribute is a BusinessDocumentMessageID 246018 datatype. The ID 246014 attribute has a cardinality of one 246016 meaning that for each instance of the MessageHeader 246008 entity there is one ID 246014 attribute.

The CreationDateTime 246020 attribute is a DateTime 246024 datatype. The CreationDateTime 246020 attribute has a cardinality of one 246022 meaning that for each instance of the MessageHeader 246008 entity there is one CreationDateTime 246020 attribute.

The MaintenanceOrder 246028 package includes a MaintenanceOrder 246030 entity.

The MaintenanceOrder 246030 entity has a cardinality of one 246032 meaning that for each instance of the MaintenanceOrderMessage 246002 entity there is one MaintenanceOrder 246030 entity. The MaintenanceOrder 246030 entity includes an ID 246034 attribute.

The ID 246034 attribute is a MaintenanceOrderID 246038 datatype. The ID 246034 attribute has a cardinality of one 246036 meaning that for each instance of the MaintenanceOrder 246030 entity there is one ID 246034 attribute.

MessageHeader Package

A MessageHeader package groups the business information that is relevant for sending a business document in a message.

MessageHeader

A MessageHeader groups business information from the perspective of the sending application, for example, information to identify the business document in a message, information about the sender, and (possibly) information about the recipient.

SenderParty

A SenderParty is the party responsible for sending a business document at business application level.

RecipientParty

A RecipientParty is the party responsible for receiving a business document at business application level.

MaintenanceOrder Package

MaintenanceOrder

A maintenance order is a requirement to execute a maintenance task on a technical object for a specific deadline.

Log Package

A Log package groups the messages used for user interaction.

Log

A log is a sequence of messages that result when an application executes a task.

Message Data Type

The message data type MaintenanceOrderSimpleByBasicDataQueryMessage contains the maintenance order included in the business document and the business information that is relevant for sending a business document in a message. FIGS. 251-1 through 251-5 show a MaintenanceOrderMessage 251000 package. The MaintenanceOrderMessage 251000 package is a <MessageDataType> 251004 datatype. The MaintenanceOrderMessage 251000 package includes a MaintenanceOrderMessage 251002 entity. The MaintenanceOrderMessage 251000 package includes various packages, namely MessageHeader 251006 and MaintenanceOrder 251028.

The MessageHeader 251006 package is a BusinessDocumentMessageHeader 251012 datatype. The MessageHeader 251006 package includes a MessageHeader 251008 entity.

The MessageHeader 251008 entity has a cardinality of one 251010 meaning that for each instance of the MaintenanceOrderMessage 251002 entity there is one MessageHeader 251008 entity. The MessageHeader 251008 entity includes various attributes, namely ID 251014 and CreationDateTime 251020.

The ID 251014 attribute is a BusinessDocumentMessageID 251018 datatype. The ID 251014 attribute has a cardinality of one 251016 meaning that for each instance of the MessageHeader 251008 entity there is one ID 251014 attribute.

The CreationDateTime 251020 attribute is a DateTime 251024 datatype. The CreationDateTime 251020 attribute has a cardinality of one 251022 meaning that for each instance of the MessageHeader 251008 entity there is one CreationDateTime 251020 attribute.

The MaintenanceOrder 251028 package includes a Selection 251030 entity.

The Selection 251030 entity has a cardinality of zero or one 251032 meaning that for each instance of the MaintenanceOrderMessage 251002 entity there may be one Selection 251030 entity. The Selection 251030 entity includes various attributes, namely MaintenanceOrderTypeCodeIntervalBoundaryTypeCode 251034, UpperMaintenanceOrderTypeCode 251040, LowerMaintenanceOrderTypeCode 251046, ResourceIDIntervalBoundaryTypeCode 251052, UpperResourceID 251058, LowerResourceID 251064, Plant???IntervalBoundaryTypeCode 251070, UpperPlant??? 251076, LowerPlant??? 251082, MaintenancePlannerGroupCodeIntervalBoundaryTypeCode 251088, UpperMaintenancePlannerGroupCode 251094, LowerMaintenancePlannerGroupCode 2510100, PlanningPlant???IntervalBoundaryTypeCode 2510106, PlanningPlant??? 2510112, PlanningPlant??? 2510118, InstallationPointIDIntervalBoundaryTypeCode 2510124, UpperInstallationPointID 2510130, LowerInstallationPointID 2510136, IndividualMaterialIDIntervalBoundaryTypeCode 2510142, UpperIndividualMaterialID 2510148, LowerIndividualMaterialID 2510154, PriorityCodeIntervalBoundaryTypeCode 2510160, UpperPriorityCode 2510166, LowerPriorityCode 2510172, Period 2510178, LifeCycleStatusCodeIntervalBoundaryTypeCode 2510184, UpperLifeCycleStatusCode 2510190 and LowerLifeCycleStatusCode 2510196.

The MaintenanceOrderTypeCodeIntervalBoundaryTypeCode 251034 attribute is an IntervalBoundaryTypeCode 251038 datatype. The MaintenanceOrderTypeCodeIntervalBoundaryTypeCode 251034 attribute has a cardinality of zero or one 251036 meaning that for each instance of the Selection 251030 entity there may be one MaintenanceOrderTypeCodeIntervalBoundaryTypeCode 251034 attribute.

The UpperMaintenanceOrderTypeCode 251040 attribute is a MaintenanceOrderTypeCode 251044 datatype. The UpperMaintenanceOrderTypeCode 251040 attribute has a cardinality of zero or one 251042 meaning that for each instance of the Selection 251030 entity there may be one UpperMaintenanceOrderTypeCode 251040 attribute.

The LowerMaintenanceOrderTypeCode 251046 attribute is a MaintenanceOrderTypeCode 251050 datatype. The LowerMaintenanceOrderTypeCode 251046 attribute has a cardinality of zero or one 251048 meaning that for each instance of the Selection 251030 entity there may be one LowerMaintenanceOrderTypeCode 251046 attribute.

The ResourceIDIntervalBoundaryTypeCode 251052 attribute is an IntervalBoundaryTypeCode 251056 datatype. The ResourceIDIntervalBoundaryTypeCode 251052 attribute has a cardinality of zero or one 251054 meaning that for each instance of the Selection 251030 entity there may be one ResourceIDIntervalBoundaryTypeCode 251052 attribute.

The UpperResourceID 251058 attribute is a ResourceID 251062 datatype. The UpperResourceID 251058 attribute has a cardinality of zero or one 251060 meaning that for each instance of the Selection 251030 entity there may be one UpperResourceID 251058 attribute.

The LowerResourceID 251064 attribute is a ResourceID 251068 datatype. The LowerResourceID 251064 attribute has a cardinality of zero or one 251066 meaning that for each instance of the Selection 251030 entity there may be one LowerResourceID 251064 attribute.

The Plant???IntervalBoundaryTypeCode 251070 attribute is an IntervalBoundaryTypeCode 251074 datatype. The Plant???IntervalBoundaryTypeCode 251070 attribute has a cardinality of zero or one 251072 meaning that for each instance of the Selection 251030 entity there may be one Plant???IntervalBoundaryTypeCode 251070 attribute.

The UpperPlant??? 251076 attribute is a ??? 251080 datatype. The UpperPlant??? 251076 attribute has a cardinality of zero or one 251078 meaning that for each instance of the Selection 251030 entity there may be one UpperPlant??? 251076 attribute.

The LowerPlant??? 251082 attribute is a ??? 251086 datatype. The LowerPlant??? 251082 attribute has a cardinality of zero or one 251084 meaning that for each instance of the Selection 251030 entity there may be one LowerPlant??? 251082 attribute.

The MaintenancePlannerGroupCodeIntervalBoundaryTypeCode 251088 attribute is an IntervalBoundaryTypeCode 251092 datatype. The MaintenancePlannerGroupCodeIntervalBoundaryTypeCode 251088 attribute has a cardinality of zero or one 251090 meaning that for each instance of the Selection 251030 entity there may be one MaintenancePlannerGroupCodeIntervalBoundaryTypeCode 251088 attribute.

The UpperMaintenancePlannerGroupCode 251094 attribute is a MaintenancePlannerGroupCode 251098 datatype. The UpperMaintenancePlannerGroupCode 251094 attribute has a cardinality of zero or one 251096 meaning that for each instance of the Selection 251030 entity there may be one UpperMaintenancePlannerGroupCode 251094 attribute.

The LowerMaintenancePlannerGroupCode 2510100 attribute is a MaintenancePlannerGroupCode 2510104 datatype. The LowerMaintenancePlannerGroupCode 2510100 attribute has a cardinality of zero or one 2510102 meaning that for each instance of the Selection 251030 entity there may be one LowerMaintenancePlannerGroupCode 2510100 attribute.

The PlanningPlant???IntervalBoundaryTypeCode 2510106 attribute is an IntervalBoundaryTypeCode 2510110 datatype. The PlanningPlant???IntervalBoundaryTypeCode 2510106 attribute has a cardinality of zero or one 2510108 meaning that for each instance of the Selection 251030 entity there may be one PlanningPlant???IntervalBoundaryTypeCode 2510106 attribute.

The PlanningPlant??? 2510112 attribute is a Plant??? 2510116 datatype. The PlanningPlant??? 2510112 attribute has a cardinality of zero or one 2510114 meaning that for each instance of the Selection 251030 entity there may be one PlanningPlant??? 2510112 attribute.

The PlanningPlant??? 2510118 attribute is a Plant??? 2510122 datatype. The PlanningPlant??? 2510118 attribute has a cardinality of zero or one 2510120 meaning that for each instance of the Selection 251030 entity there may be one PlanningPlant??? 2510118 attribute.

The InstallationPointIDIntervalBoundaryTypeCode 2510124 attribute is an IntervalBoundaryTypeCode 2510128 datatype. The InstallationPointIDIntervalBoundaryTypeCode 2510124 attribute has a cardinality of zero or one 2510126 meaning that for each instance of the Selection 251030 entity there may be one InstallationPointIDIntervalBoundaryTypeCode 2510124 attribute.

The UpperInstallationPointID 2510130 attribute is an InstallationPointID 2510134 datatype. The UpperInstallationPointID 2510130 attribute has a cardinality of zero or one 2510132 meaning that for each instance of the Selection 251030 entity there may be one UpperInstallationPointID 2510130 attribute.

The LowerInstallationPointID 2510136 attribute is an InstallationPointID 2510140 datatype. The LowerInstallationPointID 2510136 attribute has a cardinality of zero or one 2510138 meaning that for each instance of the Selection 251030 entity there may be one LowerInstallationPointID 2510136 attribute.

The IndividualMaterialIDIntervalBoundaryTypeCode 2510142 attribute is an IntervalBoundaryTypeCode 2510146 datatype. The IndividualMaterialIDIntervalBoundaryTypeCode 2510142 attribute has a cardinality of zero or one 2510144 meaning that for each instance of the Selection 251030 entity there may be one IndividualMaterialIDIntervalBoundaryTypeCode 2510142 attribute.

The UpperIndividualMaterialID 2510148 attribute is an IndividualMaterialID 2510152 datatype. The UpperIndividualMaterialID 2510148 attribute has a cardinality of zero or one 2510150 meaning that for each instance of the Selection 251030 entity there may be one UpperIndividualMaterialID 2510148 attribute.

The LowerIndividualMaterialID 2510154 attribute is an IndividualMaterialID 2510158 datatype. The LowerIndividualMaterialID 2510154 attribute has a cardinality of zero or one 2510156 meaning that for each instance of the Selection 251030 entity there may be one LowerIndividualMaterialID 2510154 attribute.

The PriorityCodeIntervalBoundaryTypeCode 2510160 attribute is an IntervalBoundaryTypeCode 2510164 datatype. The PriorityCodeIntervalBoundaryTypeCode 2510160 attribute has a cardinality of zero or one 2510162 meaning that for each instance of the Selection 251030 entity there may be one PriorityCodeIntervalBoundaryTypeCode 2510160 attribute.

The UpperPriorityCode 2510166 attribute is a PriorityCode 2510170 datatype. The UpperPriorityCode 2510166 attribute has a cardinality of zero or one 2510168 meaning that for each instance of the Selection 251030 entity there may be one UpperPriorityCode 2510166 attribute.

The LowerPriorityCode 2510172 attribute is a PriorityCode 2510176 datatype. The LowerPriorityCode 2510172 attribute has a cardinality of zero or one 2510174 meaning that for each instance of the Selection 251030 entity there may be one LowerPriorityCode 2510172 attribute.

The Period 2510178 attribute is a DateTimeInterval 2510182 datatype. The Period 2510178 attribute has a cardinality of zero or one 2510180 meaning that for each instance of the Selection 251030 entity there may be one Period 2510178 attribute.

The LifeCycleStatusCodeIntervalBoundaryTypeCode 2510184 attribute is an IntervalBoundaryTypeCode 2510188 datatype. The LifeCycleStatusCodeIntervalBoundaryTypeCode 2510184 attribute has a cardinality of zero or one 2510186 meaning that for each instance of the Selection 251030 entity there may be one LifeCycleStatusCodeIntervalBoundaryTypeCode 2510184 attribute.

The UpperLifeCycleStatusCode 2510190 attribute is a LogisticsOrderLifeCycleStatusCode 2510194 datatype. The UpperLifeCycleStatusCode 2510190 attribute has a cardinality of zero or one 2510192 meaning that for each instance of the Selection 251030 entity there may be one UpperLifeCycleStatusCode 2510190 attribute.

The LowerLifeCycleStatusCode 2510196 attribute is a LogisticsOrderLifeCycleStatusCode 2510200 datatype. The LowerLifeCycleStatusCode 2510196 attribute has a cardinality of zero or one 2510198 meaning that for each instance of the Selection 251030 entity there may be one LowerLifeCycleStatusCode 2510196 attribute.

MessageHeader Package

A MessageHeader package groups the business information that is relevant for sending a business document in a message.

MessageHeader

A MessageHeader groups business information from the perspective of the sending application, for example, information to identify the business document in a message, information about the sender, and (possibly) information about the recipient.

SenderParty

A SenderParty is the party responsible for sending a business document at business application level.

RecipientParty

A RecipientParty is the party responsible for receiving a business document at business application level.

Selection Package

MaintenanceOrderSelectionByBasicData

The MaintenanceOrderSelectionByBasicData specifies selection criteria to select MaintenanceOrder.

Message Data Type

The message data type MaintenanceOrderAllowedMaintenancePlannerGroupByMaintenancePlanningPlantQuery Message_sync contains the selection for maintenance planner group. FIG. 242 shows a MaintenanceOrderAllowedMaintenancePlannerGroupByMaintenancePlanningPlantQuery Message_sync 242000 package. The MaintenanceOrderAllowedMaintenancePlannerGroupByMaintenancePlanningPlantQuery Message_sync 242000 package is a MaintenanceOrderAllowedMaintenancePlannerGroupByMaintenancePlanningPlantQuery Message_sync 242004 datatype. The MaintenanceOrderAllowedMaintenancePlannerGroupByMaintenancePlanningPlantQuery Message_sync 242000 package includes a MaintenanceOrderAllowedMaintenancePlannerGroupByMaintenancePlanningPlantQuery Message_sync 242002 entity. The MaintenanceOrderAllowedMaintenancePlannerGroupByMaintenancePlanningPlantQuery Message_sync 242000 package includes a Selection 242006 package.

The Selection 242006 package includes a MaintenanceOrderAllowedMaintenancePlannerGroupSelectionByMaintenancePlanningPlant 242008 entity. The MaintenanceOrderAllowedMaintenancePlannerGroupSelectionByMaintenancePlanningPlant 242008 entity has a cardinality of one 242010 meaning that for each instance of the MaintenanceOrderAllowedMaintenancePlannerGroupByMaintenancePlanningPlantQuery Message_sync 242002 entity there is one MaintenanceOrderAllowedMaintenancePlannerGroupSelectionByMaintenancePlanningPlant 242008 entity. The MaintenanceOrderAllowedMaintenancePlannerGroupSelectionByMaintenancePlanningPlant 242008 entity includes a MaintenancePlanningPlantID 242012 attribute.

The MaintenancePlanningPlantID 242012 attribute is a PlantID 242016 datatype. The MaintenancePlanningPlantID 242012 attribute has a cardinality of one 242014 meaning that for each instance of the MaintenanceOrderAllowedMaintenancePlannerGroupSelectionByMaintenancePlanningPlant 242008 entity there is one MaintenancePlanningPlantID 242012 attribute.

Selection Package

The Selection package collects all the selection criteria MaintenanceOrderAllowedMaintenancePlannerGroupSelectionByMaintenancePlanningPlant A MaintenancePlanningPlantID is the identifier of the Plant responsible for planning maintenance tasks.

Message Data Type

The message data type MaintenanceOrderAllowedMaintenancePlannerGroupByMaintenancePlanningPlantResponseMessage_sync contains the Maintenance Order included in the business document and the business information that is relevant for sending information, warning or error messages when processing operations. FIG. 243 shows a MaintenanceOrderAllowedMaintenancePlannerGroupByMaintenancePlanningPlantResponseMessage_sync 243000 package. The MaintenanceOrderAllowedMaintenancePlannerGroupByMaintenancePlanningPlantResponseMessage_sync 243000 package is a MaintenanceOrderAllowedMaintenancePlannerGroupByMaintenancePlanningPlantResponseMessage_sync 243004 datatype. The MaintenanceOrderAllowedMaintenancePlannerGroupByMaintenancePlanningPlantResponseMessage_sync 243000 package includes a MaintenanceOrderAllowedMaintenancePlannerGroupByMaintenancePlanningPlantResponseMessage_sync 243002 entity. The MaintenanceOrderAllowedMaintenancePlannerGroupByMaintenancePlanningPlantResponseMessage_sync 243000 package includes various packages, namely MaintenanceOrder 243006 and Log 243024.

The MaintenanceOrder 243006 package includes a MaintenanceOrderAllowedMaintenancePlannerGroup 243008 entity.

The MaintenanceOrderAllowedMaintenancePlannerGroup 243008 entity has a cardinality of zero or n 243010 meaning that for each instance of the MaintenanceOrderAllowedMaintenancePlannerGroupByMaintenancePlanningPlantResponseMessage_sync 243002 entity there may be one or more MaintenanceOrderAllowedMaintenancePlannerGroup 243008 entities. The MaintenanceOrderAllowedMaintenancePlannerGroup 243008 entity includes various attributes, namely Code 243012 and Name 243018.

The Code 243012 attribute is a MaintenancePlannerGroupCode 243016 datatype. The Code 243012 attribute has a cardinality of one 243014 meaning that for each instance of the MaintenanceOrderAllowedMaintenancePlannerGroup 243008 entity there is one Code 243012 attribute.

The Name 243018 attribute is a LANGUAGEINDEPENDENT_LEN18_Name 243022 datatype. The Name 243018 attribute has a cardinality of zero or one 243020 meaning that for each instance of the MaintenanceOrderAllowedMaintenancePlannerGroup 243008 entity there may be one Name 243018 attribute.

The Log 243024 package is a Log 243030 datatype. The Log 243024 package includes a Log 243026 entity.

The Log 243026 entity has a cardinality of one 243028 meaning that for each instance of the MaintenanceOrderAllowedMaintenancePlannerGroupByMaintenancePlanningPlantResponseMessage_sync 243002 entity there is one Log 243026 entity.

MaintenanceOrder Package

MaintenanceOrderAllowedMaintenancePlannerGroup

MaintenanceOrderAllowedMaintenancePlannerGroup specifies the list of allowed maintenance planner groups for a maintenance planning plant. Code (may be optional) refers to a coded representation of allowed maintenance planner group for a maintenance planning plant. Name (may be optional) refers to the name of maintenance planner group Message Data Type The message data type MaintenanceOrderAllowedUserStatusByTypeQueryMessage_sync contains the Selection included in the business document. FIG. 244 shows a MaintenanceOrderAllowedUserStatusByIDQueryMessage_sync 244000 package. The MaintenanceOrderAllowedUserStatusByIDQueryMessage_sync 244000 package is a MaintenanceOrderAllowedUserStatusByIDQueryMessage_sync 244004 datatype. The MaintenanceOrderAllowedUserStatusByIDQueryMessage_sync 244000 package includes a MaintenanceOrderAllowedUserStatusByIDQueryMessage_sync 244002 entity. The MaintenanceOrderAllowedUserStatusByIDQueryMessage_sync 244000 package includes a Selection 244006 package.

The Selection 244006 package includes a MaintenanceOrderAllowedUserStatusSelectionByType 244008 entity.

The MaintenanceOrderAllowedUserStatusSelectionByType 244008 entity has a cardinality of one 244010 meaning that for each instance of the MaintenanceOrderAllowedUserStatusByIDQueryMessage_sync 244002 entity there is one MaintenanceOrderAllowedUserStatusSelectionByType 244008 entity. The MaintenanceOrderAllowedUserStatusSelectionByType 244008 entity includes a MaintenanceOrderTypeCode 244012 attribute.

The MaintenanceOrderTypeCode 244012 attribute is a MaintenanceOrderTypeCode 244016 datatype. The MaintenanceOrderTypeCode 244012 attribute has a cardinality of one 244014 meaning that for each instance of the MaintenanceOrderAllowedUserStatusSelectionByType 244008 entity there is one MaintenanceOrderTypeCode 244012 attribute.

Selection Package

The Selection package collects all the selection criteria.

MaintenanceOrderAllowedUserStatusSelectionByType

The MaintenanceOrderTypeCode refers to the coded representation of the type of a MaintenanceOrder.

Message Data Type

The message data type MaintenanceOrderAllowedUserStatusByTypeResponseMessage_sync contains the Maintenance Order included in the business document and the business information that is relevant for sending information, warning or error messages when processing operations. FIG. 245 shows a MaintenanceOrderAllowedUserStatusByIDResponseMessage_sync 245000 package. The MaintenanceOrderAllowedUserStatusByIDResponseMessage_sync 245000 package is a MaintenanceOrderAllowedUserStatusByIDResponseMessage_sync 245004 datatype. The MaintenanceOrderAllowedUserStatusByIDResponseMessage_sync 245000 package includes a MaintenanceOrderAllowedUserStatusByIDResponseMessage_sync 245002 entity. The MaintenanceOrderAllowedUserStatusByIDResponseMessage_sync 245000 package includes various packages, namely MaintenanceOrder 245006 and Log 245018.

The MaintenanceOrder 245006 package includes a MaintenanceOrderAllowedUserStatus 245008 entity.

The MaintenanceOrderAllowedUserStatus 245008 entity has a cardinality of zero or one 245010 meaning that for each instance of the MaintenanceOrderAllowedUserStatusByIDResponseMessage_sync 245002 entity there may be one MaintenanceOrderAllowedUserStatus 245008 entity. The MaintenanceOrderAllowedUserStatus 245008 entity includes a StatusObject 245012 attribute.

The StatusObject 245012 attribute is a StatusObject 245016 datatype. The StatusObject 245012 attribute has a cardinality of one 245014 meaning that for each instance of the MaintenanceOrderAllowedUserStatus 245008 entity there is one StatusObject 245012 attribute.

The Log 245018 package is a Log 245024 datatype. The Log 245018 package includes a Log 245020 entity.

The Log 245020 entity has a cardinality of one 245022 meaning that for each instance of the MaintenanceOrderAllowedUserStatusByIDResponseMessage_sync 245002 entity there is one Log 245020 entity.

MaintenanceOrder Package

MaintenanceOrderAllowedUserStatus

MaintenanceOrderAllowedUserStatus specifies the list of allowed statuses for a maintenance order. UserStatusCode (may be optional) refers to a coded representation of a UserStatus. UserStatusName (may be optional) refers to a name of the UserStatus.

Message Data Type

FIGS. 247-1 through 247-18 show a MaintenanceOrderMessage 247000 package. The MaintenanceOrderMessage 247000 package is a <MessageDataType> 247004 datatype. The MaintenanceOrderMessage 247000 package includes a MaintenanceOrderMessage 247002 entity. The MaintenanceOrderMessage 247000 package includes various packages, namely MessageHeader 247006, MaintenanceOrder 247028 and Log 2470574.

The MessageHeader 247006 package is a BusinessDocumentMessageHeader 247012 datatype. The MessageHeader 247006 package includes a MessageHeader 247008 entity.

The MessageHeader 247008 entity has a cardinality of one 247010 meaning that for each instance of the MaintenanceOrderMessage 247002 entity there is one MessageHeader 247008 entity. The MessageHeader 247008 entity includes various attributes, namely ID 247014 and CreationDateTime 247020.

The ID 247014 attribute is a BusinessDocumentMessageID 247018 datatype. The ID 247014 attribute has a cardinality of one 247016 meaning that for each instance of the MessageHeader 247008 entity there is one ID 247014 attribute.

The CreationDateTime 247020 attribute is a DateTime 247024 datatype. The CreationDateTime 247020 attribute has a cardinality of one 247022 meaning that for each instance of the MessageHeader 247008 entity there is one CreationDateTime 247020 attribute.

The MaintenanceOrder 247028 package includes a MaintenanceOrder 247030 entity. The MaintenanceOrder 247028 package includes various packages, namely Operation 2470202, Party 2470422 and CostSettlementRule 2470472.

The MaintenanceOrder 247030 entity has a cardinality of zero or one 247032 meaning that for each instance of the MaintenanceOrderMessage 247002 entity there may be one MaintenanceOrder 247030 entity. The MaintenanceOrder 247030 entity includes various attributes, namely ID 247034, TypeCode 247040, TypeName 247046, MaintenancePlanningPlantID 247052, MaintenancePlanningPlantName 247058, AccountingBusinessAreaCode 247064, WorkCentreID 247070, WorkCentreName 247076, WorkCentrePlantID 247082, WorkCentrePlantName 247088, MaintenancePlannerGroupCode 247094, MaintenancePlannerGroupName 2470100, InstallationPointID 2470106, IndividualMaterialID 2470112, MaterialID 2470118, SerialID 2470124, ImportanceCode 2470130, Description 2470136, TextCollection 2470142, MaintenanceRequestID 2470148, RequestedExecutionPeriod 2470154, ScheduledExecutionPeriod 2470160, ActualExecutionPeriod 2470166, SystemAdministrativeData 2470172, EstimatedTotalAmount 2470178, PlannedTotalAmount 2470184, ActualTotalAmount 2470190 and StatusObject 2470196.

The ID 247034 attribute is a MaintenanceOrderID 247038 datatype. The ID 247034 attribute has a cardinality of zero or one 247036 meaning that for each instance of the MaintenanceOrder 247030 entity there may be one ID 247034 attribute.

The TypeCode 247040 attribute is a MaintenanceOrderTypeCode 247044 datatype. The TypeCode 247040 attribute has a cardinality of zero or one 247042 meaning that for each instance of the MaintenanceOrder 247030 entity there may be one TypeCode 247040 attribute.

The TypeName 247046 attribute is a MEDIUM_Name 247050 datatype. The TypeName 247046 attribute has a cardinality of zero or one 247048 meaning that for each instance of the MaintenanceOrder 247030 entity there may be one TypeName 247046 attribute.

The MaintenancePlanningPlantID 247052 attribute is a PlantID 247056 datatype. The MaintenancePlanningPlantID 247052 attribute has a cardinality of zero or one 247054 meaning that for each instance of the MaintenanceOrder 247030 entity there may be one MaintenancePlanningPlantID 247052 attribute.

The MaintenancePlanningPlantName 247058 attribute is a LANGUAGEINDEPENDENT_LEN30_Name 247062 datatype. The MaintenancePlanningPlantName 247058 attribute has a cardinality of zero or one 247060 meaning that for each instance of the MaintenanceOrder 247030 entity there may be one MaintenancePlanningPlantName 247058 attribute.

The AccountingBusinessAreaCode 247064 attribute is an AccountingBusinessAreaCode 247068 datatype. The AccountingBusinessAreaCode 247064 attribute has a cardinality of zero or one 247066 meaning that for each instance of the MaintenanceOrder 247030 entity there may be one AccountingBusinessAreaCode 247064 attribute.

The WorkCentreID 247070 attribute is a WorkCentreID 247074 datatype. The WorkCentreID 247070 attribute has a cardinality of zero or one 247072 meaning that for each instance of the MaintenanceOrder 247030 entity there may be one WorkCentreID 247070 attribute.

The WorkCentreName 247076 attribute is a MEDIUM_Name 247080 datatype. The WorkCentreName 247076 attribute has a cardinality of zero or one 247078 meaning that for each instance of the MaintenanceOrder 247030 entity there may be one WorkCentreName 247076 attribute.

The WorkCentrePlantID 247082 attribute is a PlantID 247086 datatype. The WorkCentrePlantID 247082 attribute has a cardinality of zero or one 247084 meaning that for each instance of the MaintenanceOrder 247030 entity there may be one WorkCentrePlantID 247082 attribute.

The WorkCentrePlantName 247088 attribute is a LANGUAGEINDEPENDENT_LEN30_Name 247092 datatype. The WorkCentrePlantName 247088 attribute has a cardinality of zero or one 247090 meaning that for each instance of the MaintenanceOrder 247030 entity there may be one WorkCentrePlantName 247088 attribute.

The MaintenancePlannerGroupCode 247094 attribute is a MaintenancePlannerGroupCode 247098 datatype. The MaintenancePlannerGroupCode 247094 attribute has a cardinality of zero or one 247096 meaning that for each instance of the MaintenanceOrder 247030 entity there may be one MaintenancePlannerGroupCode 247094 attribute.

The MaintenancePlannerGroupName 2470100 attribute is a LANGUAGEINDEPENDENT_LEN18_Name 2470104 datatype. The MaintenancePlannerGroupName 2470100 attribute has a cardinality of zero or one 2470102 meaning that for each instance of the MaintenanceOrder 247030 entity there may be one MaintenancePlannerGroupName 2470100 attribute.

The InstallationPointID 2470106 attribute is an InstallationPointID 2470110 datatype. The InstallationPointID 2470106 attribute has a cardinality of zero or one 2470108 meaning that for each instance of the MaintenanceOrder 247030 entity there may be one InstallationPointID 2470106 attribute.

The IndividualMaterialID 2470112 attribute is a ProductID 2470116 datatype. The IndividualMaterialID 2470112 attribute has a cardinality of zero or one 2470114 meaning that for each instance of the MaintenanceOrder 247030 entity there may be one IndividualMaterialID 2470112 attribute.

The MaterialID 2470118 attribute is a ProductInternalID 2470122 datatype. The MaterialID 2470118 attribute has a cardinality of zero or one 2470120 meaning that for each instance of the MaintenanceOrder 247030 entity there may be one MaterialID 2470118 attribute.

The SerialID 2470124 attribute is a SerialID 2470128 datatype. The SerialID 2470124 attribute has a cardinality of zero or one 2470126 meaning that for each instance of the MaintenanceOrder 247030 entity there may be one SerialID 2470124 attribute.

The ImportanceCode 2470130 attribute is an ImportanceCode 2470134 datatype. The ImportanceCode 2470130 attribute has a cardinality of zero or one 2470132 meaning that for each instance of the MaintenanceOrder 247030 entity there may be one ImportanceCode 2470130 attribute.

The Description 2470136 attribute is a SHORT_Description 2470140 datatype. The Description 2470136 attribute has a cardinality of zero or one 2470138 meaning that for each instance of the MaintenanceOrder 247030 entity there may be one Description 2470136 attribute.

The TextCollection 2470142 attribute is a TextCollection 2470146 datatype. The TextCollection 2470142 attribute has a cardinality of zero or one 2470144 meaning that for each instance of the MaintenanceOrder 247030 entity there may be one TextCollection 2470142 attribute.

The MaintenanceRequestID 2470148 attribute is a MaintenanceRequestID 2470152 datatype. The MaintenanceRequestID 2470148 attribute has a cardinality of zero or one 2470150 meaning that for each instance of the MaintenanceOrder 247030 entity there may be one MaintenanceRequestID 2470148 attribute.

The RequestedExecutionPeriod 2470154 attribute is an UPPEROPEN_TIMEZONEINDEPENDENT_ DateTimePeriod 2470158 datatype. The RequestedExecutionPeriod 2470154 attribute has a cardinality of zero or one 2470156 meaning that for each instance of the MaintenanceOrder 247030 entity there may be one RequestedExecutionPeriod 2470154 attribute.

The ScheduledExecutionPeriod 2470160 attribute is an UPPEROPEN_TIMEZONEINDEPENDENT_ DateTimePeriod 2470164 datatype. The ScheduledExecutionPeriod 2470160 attribute has a cardinality of zero or one 2470162 meaning that for each instance of the MaintenanceOrder 247030 entity there may be one ScheduledExecutionPeriod 2470160 attribute.

The ActualExecutionPeriod 2470166 attribute is an UPPEROPEN_TIMEZONEINDEPENDENT_ DateTimePeriod 2470170 datatype. The ActualExecutionPeriod 2470166 attribute has a cardinality of zero or one 2470168 meaning that for each instance of the MaintenanceOrder 247030 entity there may be one ActualExecutionPeriod 2470166 attribute.

The SystemAdministrativeData 2470172 attribute is a SystemAdministrativeData 2470176 datatype. The SystemAdministrativeData 2470172 attribute has a cardinality of zero or one 2470174 meaning that for each instance of the MaintenanceOrder 247030 entity there may be one SystemAdministrativeData 2470172 attribute.

The EstimatedTotalAmount 2470178 attribute is an Amount 2470182 datatype. The EstimatedTotalAmount 2470178 attribute has a cardinality of zero or one 2470180 meaning that for each instance of the MaintenanceOrder 247030 entity there may be one EstimatedTotalAmount 2470178 attribute.

The PlannedTotalAmount 2470184 attribute is an Amount 2470188 datatype. The PlannedTotalAmount 2470184 attribute has a cardinality of zero or one 2470186 meaning that for each instance of the MaintenanceOrder 247030 entity there may be one PlannedTotalAmount 2470184 attribute.

The ActualTotalAmount 2470190 attribute is an Amount 2470194 datatype. The ActualTotalAmount 2470190 attribute has a cardinality of zero or one 2470192 meaning that for each instance of the MaintenanceOrder 247030 entity there may be one ActualTotalAmount 2470190 attribute.

The StatusObject 2470196 attribute is a StatusObject 2470200 datatype. The StatusObject 2470196 attribute has a cardinality of zero or one 2470198 meaning that for each instance of the MaintenanceOrder 247030 entity there may be one StatusObject 2470196 attribute.

The Operation 2470202 package includes an Operation 2470204 entity.

The Operation 2470204 entity has a cardinality of zero or n 2470206 meaning that for each instance of the MaintenanceOrder 247030 entity there may be one or more Operation 2470204 entities. The Operation 2470204 entity includes various attributes, namely ID 2470208, ActivityID 2470214, ControlProfileCode 2470220, WorkCentreID 2470226, WorkCentreName 2470232, WorkCentrePlantID 2470238, WorkCentrePlantName 2470244, Description 2470250, TextCollection 2470256, CalculateOperationWorkloadComponentCode 2470262, ResourceClassID 2470268, WorkAgreementID 2470274, EmployeePersonFormattedName 2470280, PlannedDurationQuantity 2470286, PlannedWorkQuantity 2470292, EarliestExecutionPeriod 2470298, LatestExecutionPeriod 2470304, ActualWorkQuantity 2470310, ActualExecutionPeriod 2470316, ForecastEndDateTime 2470322, ForecastWorkQuantity 2470328 and StatusObject 2470334. The Operation 2470204 entity includes a MaterialInput 2470340 subordinate entity.

The ID 2470208 attribute is an OperationID 2470212 datatype. The ID 2470208 attribute has a cardinality of zero or one 2470210 meaning that for each instance of the Operation 2470204 entity there may be one ID 2470208 attribute.

The ActivityID 2470214 attribute is an OperationActivityID 2470218 datatype. The ActivityID 2470214 attribute has a cardinality of zero or one 2470216 meaning that for each instance of the Operation 2470204 entity there may be one ActivityID 2470214 attribute.

The ControlProfileCode 2470220 attribute is an OperationControlProfileCode 2470224 datatype. The ControlProfileCode 2470220 attribute has a cardinality of zero or one 2470222 meaning that for each instance of the Operation 2470204 entity there may be one ControlProfileCode 2470220 attribute.

The WorkCentreID 2470226 attribute is a WorkCentreID 2470230 datatype. The WorkCentreID 2470226 attribute has a cardinality of zero or one 2470228 meaning that for each instance of the Operation 2470204 entity there may be one WorkCentreID 2470226 attribute.

The WorkCentreName 2470232 attribute is a MEDIUM_Name 2470236 datatype. The WorkCentreName 2470232 attribute has a cardinality of zero or one 2470234 meaning that for each instance of the Operation 2470204 entity there may be one WorkCentreName 2470232 attribute.

The WorkCentrePlantID 2470238 attribute is a PlantID 2470242 datatype. The WorkCentrePlantID 2470238 attribute has a cardinality of zero or one 2470240 meaning that for each instance of the Operation 2470204 entity there may be one WorkCentrePlantID 2470238 attribute.

The WorkCentrePlantName 2470244 attribute is a LANGUAGEINDEPENDENT_LEN30_Name 2470248 datatype. The WorkCentrePlantName 2470244 attribute has a cardinality of zero or one 2470246 meaning that for each instance of the Operation 2470204 entity there may be one WorkCentrePlantName 2470244 attribute.

The Description 2470250 attribute is a MEDIUM_Description 2470254 datatype. The Description 2470250 attribute has a cardinality of zero or one 2470252 meaning that for each instance of the Operation 2470204 entity there may be one Description 2470250 attribute.

The TextCollection 2470256 attribute is a TextCollection 2470260 datatype. The TextCollection 2470256 attribute has a cardinality of zero or one 2470258 meaning that for each instance of the Operation 2470204 entity there may be one TextCollection 2470256 attribute.

The CalculateOperationWorkloadComponentCode 2470262 attribute is an OperationWorkloadComponentCode 2470266 datatype. The CalculateOperationWorkloadComponentCode 2470262 attribute has a cardinality of zero or one 2470264 meaning that for each instance of the Operation 2470204 entity there may be one CalculateOperationWorkloadComponentCode 2470262 attribute.

The ResourceClassID 2470268 attribute is a ResourceClassID 2470272 datatype. The ResourceClassID 2470268 attribute has a cardinality of zero or one 2470270 meaning that for each instance of the Operation 2470204 entity there may be one ResourceClassID 2470268 attribute.

The WorkAgreementID 2470274 attribute is a WorkAgreementID 2470278 datatype. The WorkAgreementID 2470274 attribute has a cardinality of zero or one 2470276 meaning that for each instance of the Operation 2470204 entity there may be one WorkAgreementID 2470274 attribute.

The EmployeePersonFormattedName 2470280 attribute is a LANGUAGEINDEPENDENT_LONG_Name 2470284 datatype. The EmployeePersonFormattedName 2470280 attribute has a cardinality of zero or one 2470282 meaning that for each instance of the Operation 2470204 entity there may be one EmployeePersonFormattedName 2470280 attribute.

The PlannedDurationQuantity 2470286 attribute is a Duration 2470290 datatype. The PlannedDurationQuantity 2470286 attribute has a cardinality of zero or one 2470288 meaning that for each instance of the Operation 2470204 entity there may be one PlannedDurationQuantity 2470286 attribute.

The PlannedWorkQuantity 2470292 attribute is a Quantity 2470296 datatype. The PlannedWorkQuantity 2470292 attribute has a cardinality of zero or one 2470294 meaning that for each instance of the Operation 2470204 entity there may be one PlannedWorkQuantity 2470292 attribute.

The EarliestExecutionPeriod 2470298 attribute is an UPPEROPEN_TIMEZONEINDEPENDENT_ DateTimePeriod 2470302 datatype. The EarliestExecutionPeriod 2470298 attribute has a cardinality of zero or one 2470300 meaning that for each instance of the Operation 2470204 entity there may be one EarliestExecutionPeriod 2470298 attribute.

The LatestExecutionPeriod 2470304 attribute is an UPPEROPEN_TIMEZONEINDEPENDENT_ DateTimePeriod 2470308 datatype. The LatestExecutionPeriod 2470304 attribute has a cardinality of zero or one 2470306 meaning that for each instance of the Operation 2470204 entity there may be one LatestExecutionPeriod 2470304 attribute.

The ActualWorkQuantity 2470310 attribute is a Quantity 2470314 datatype. The ActualWorkQuantity 2470310 attribute has a cardinality of zero or one 2470312 meaning that for each instance of the Operation 2470204 entity there may be one ActualWorkQuantity 2470310 attribute.

The ActualExecutionPeriod 2470316 attribute is an UPPEROPEN_TIMEZONEINDEPENDENT_ DateTimePeriod 2470320 datatype. The ActualExecutionPeriod 2470316 attribute has a cardinality of zero or one 2470318 meaning that for each instance of the Operation 2470204 entity there may be one ActualExecutionPeriod 2470316 attribute.

The ForecastEndDateTime 2470322 attribute is an UPPEROPEN_TIMEZONEINDEPENDENT_ DateTimePeriod 2470326 datatype. The ForecastEndDateTime 2470322 attribute has a cardinality of zero or one 2470324 meaning that for each instance of the Operation 2470204 entity there may be one ForecastEndDateTime 2470322 attribute.

The ForecastWorkQuantity 2470328 attribute is a Quantity 2470332 datatype. The ForecastWorkQuantity 2470328 attribute has a cardinality of zero or one 2470330 meaning that for each instance of the Operation 2470204 entity there may be one ForecastWorkQuantity 2470328 attribute.

The StatusObject 2470334 attribute is a StatusObject 2470338 datatype. The StatusObject 2470334 attribute has a cardinality of zero or one 2470336 meaning that for each instance of the Operation 2470204 entity there may be one StatusObject 2470334 attribute.

The MaterialInput 2470340 entity has a cardinality of zero or n 2470342 meaning that for each instance of the Operation 2470204 entity there may be one or more MaterialInput 2470340 entities. The MaterialInput 2470340 entity includes various attributes, namely ReservationID 2470344, ReservationItemID 2470350, GoodsMovementAllowedIndicator 2470356, MaterialID 2470362, PlantID 2470368, InventoryManagedLocationID 2470374, Description 2470380, TextCollection 2470386, LogisticsConfirmationMethodCode 2470392, RequirementQuantity 2470398, ProcurementEffectivenessConditionCode 2470404, AllocatedQuantity 2470410 and FullfilledQuantity 2470416.

The ReservationID 2470344 attribute is a ReservationID 2470348 datatype. The ReservationID 2470344 attribute has a cardinality of zero or one 2470346 meaning that for each instance of the MaterialInput 2470340 entity there may be one ReservationID 2470344 attribute.

The ReservationItemID 2470350 attribute is a ReservationItemID 2470354 datatype. The ReservationItemID 2470350 attribute has a cardinality of zero or one 2470352 meaning that for each instance of the MaterialInput 2470340 entity there may be one ReservationItemID 2470350 attribute.

The GoodsMovementAllowedIndicator 2470356 attribute is an Indicator 2470360 datatype. The GoodsMovementAllowedIndicator 2470356 attribute has a cardinality of zero or one 2470358 meaning that for each instance of the MaterialInput 2470340 entity there may be one GoodsMovementAllowedIndicator 2470356 attribute.

The MaterialID 2470362 attribute is a ProductInternalID 2470366 datatype. The MaterialID 2470362 attribute has a cardinality of zero or one 2470364 meaning that for each instance of the MaterialInput 2470340 entity there may be one MaterialID 2470362 attribute.

The PlantID 2470368 attribute is a PlantID 2470372 datatype. The PlantID 2470368 attribute has a cardinality of zero or one 2470370 meaning that for each instance of the MaterialInput 2470340 entity there may be one PlantID 2470368 attribute.

The InventoryManagedLocationID 2470374 attribute is a LocationInternalID 2470378 datatype. The InventoryManagedLocationID 2470374 attribute has a cardinality of zero or one 2470376 meaning that for each instance of the MaterialInput 2470340 entity there may be one InventoryManagedLocationID 2470374 attribute.

The Description 2470380 attribute is a SHORT_Description 2470384 datatype. The Description 2470380 attribute has a cardinality of zero or one 2470382 meaning that for each instance of the MaterialInput 2470340 entity there may be one Description 2470380 attribute.

The TextCollection 2470386 attribute is a TextCollection 2470390 datatype. The TextCollection 2470386 attribute has a cardinality of zero or one 2470388 meaning that for each instance of the MaterialInput 2470340 entity there may be one TextCollection 2470386 attribute.

The LogisticsConfirmationMethodCode 2470392 attribute is a LogisticsConfirmationMethodCode 2470396 datatype. The LogisticsConfirmationMethodCode 2470392 attribute has a cardinality of zero or one 2470394 meaning that for each instance of the MaterialInput 2470340 entity there may be one LogisticsConfirmationMethodCode 2470392 attribute.

The RequirementQuantity 2470398 attribute is a Quantity 2470402 datatype. The RequirementQuantity 2470398 attribute has a cardinality of zero or one 2470400 meaning that for each instance of the MaterialInput 2470340 entity there may be one RequirementQuantity 2470398 attribute.

The ProcurementEffectivenessConditionCode 2470404 attribute is a ProcurementEffectivenessConditionCode 2470408 datatype. The ProcurementEffectivenessConditionCode 2470404 attribute has a cardinality of zero or one 2470406 meaning that for each instance of the MaterialInput 2470340 entity there may be one ProcurementEffectivenessConditionCode 2470404 attribute.

The AllocatedQuantity 2470410 attribute is a Quantity 2470414 datatype. The AllocatedQuantity 2470410 attribute has a cardinality of zero or one 2470412 meaning that for each instance of the MaterialInput 2470340 entity there may be one AllocatedQuantity 2470410 attribute.

The FullfilledQuantity 2470416 attribute is a Quantity 2470420 datatype. The FullfilledQuantity 2470416 attribute has a cardinality of zero or one 2470418 meaning that for each instance of the MaterialInput 2470340 entity there may be one FullfilledQuantity 2470416 attribute.

The Party 2470422 package includes various entities, namely ProductRecipientParty 2470424, VendorParty 2470440 and ResponsibleEmployeeParty 2470456.

The ProductRecipientParty 2470424 entity has a cardinality of zero or n 2470426 meaning that for each instance of the MaintenanceOrder 247030 entity there may be one or more ProductRecipientParty 2470424 entities. The ProductRecipientParty 2470424 entity includes various attributes, namely ProductRecipientParty 2470428 and ProductRecipientName 2470434.

The ProductRecipientParty 2470428 attribute is a PartyInternalID 2470432 datatype. The ProductRecipientParty 2470428 attribute has a cardinality of zero or one 2470430 meaning that for each instance of the ProductRecipientParty 2470424 entity there may be one ProductRecipientParty 2470428 attribute.

The ProductRecipientName 2470434 attribute is a LANGUAGEINDEPENDENT_MEDIUM_Name 2470438 datatype. The ProductRecipientName 2470434 attribute has a cardinality of zero or one 2470436 meaning that for each instance of the ProductRecipientParty 2470424 entity there may be one ProductRecipientName 2470434 attribute.

The VendorParty 2470440 entity has a cardinality of zero or n 2470442 meaning that for each instance of the MaintenanceOrder 247030 entity there may be one or more VendorParty 2470440 entities. The VendorParty 2470440 entity includes various attributes, namely VendorParty 2470444 and VendorName 2470450.

The VendorParty 2470444 attribute is a PartyInternalID 2470448 datatype. The VendorParty 2470444 attribute has a cardinality of zero or one 2470446 meaning that for each instance of the VendorParty 2470440 entity there may be one VendorParty 2470444 attribute.

The VendorName 2470450 attribute is a LANGUAGEINDEPENDENT_MEDIUM_Name 2470454 datatype. The VendorName 2470450 attribute has a cardinality of zero or one 2470452 meaning that for each instance of the VendorParty 2470440 entity there may be one VendorName 2470450 attribute.

The ResponsibleEmployeeParty 2470456 entity has a cardinality of zero or n 2470458 meaning that for each instance of the MaintenanceOrder 247030 entity there may be one or more ResponsibleEmployeeParty 2470456 entities. The ResponsibleEmployeeParty 2470456 entity includes various attributes, namely ResponsibleEmployeeParty 2470460 and ResponsibleEmployeeName 2470466.

The ResponsibleEmployeeParty 2470460 attribute is a PartyInternalID 2470464 datatype. The ResponsibleEmployeeParty 2470460 attribute has a cardinality of zero or one 2470462 meaning that for each instance of the ResponsibleEmployeeParty 2470456 entity there may be one ResponsibleEmployeeParty 2470460 attribute.

The ResponsibleEmployeeName 2470466 attribute is a LANGUAGEINDEPENDENT_MEDIUM_Name 2470470 datatype. The ResponsibleEmployeeName 2470466 attribute has a cardinality of zero or one 2470468 meaning that for each instance of the ResponsibleEmployeeParty 2470456 entity there may be one ResponsibleEmployeeName 2470466 attribute.

The CostSettlementRule 2470472 package includes a CostSettlementRule 2470474 entity.

The CostSettlementRule 2470474 entity has a cardinality of zero or n 2470476 meaning that for each instance of the MaintenanceOrder 247030 entity there may be one or more CostSettlementRule 2470474 entities. The CostSettlementRule 2470474 entity includes various attributes, namely OrdinalNumberValue 2470478, ControllingSettlementTypeCode 2470484, AssignmentPercent 2470490, MasterFixedAssetID 2470496, FixedAssetID 2470502, InternalOrderID 2470508, MaintenanceOrderID 2470514, CostCentreID 2470520, ProjectNetworkID 2470526, ProjectActivityID 2470532, ProjectWorkBreakdownStructureElementID 2470538, GeneralLedgerAccountID 2470544, ValidToFiscalYearID 2470550, ValidToAccountingPeriodID 2470556, ValidFromFiscalYearID 2470562 and ValidFromAccountingPeriodID 2470568.

The OrdinalNumberValue 2470478 attribute is an OrdinalNumberValue 2470482 datatype. The OrdinalNumberValue 2470478 attribute has a cardinality of zero or one 2470480 meaning that for each instance of the CostSettlementRule 2470474 entity there may be one OrdinalNumberValue 2470478 attribute.

The ControllingSettlementTypeCode 2470484 attribute is a ControllingSettlementTypeCode 2470488 datatype. The ControllingSettlementTypeCode 2470484 attribute has a cardinality of zero or one 2470486 meaning that for each instance of the CostSettlementRule 2470474 entity there may be one ControllingSettlementTypeCode 2470484 attribute.

The AssignmentPercent 2470490 attribute is a Percent 2470494 datatype. The AssignmentPercent 2470490 attribute has a cardinality of zero or one 2470492 meaning that for each instance of the CostSettlementRule 2470474 entity there may be one AssignmentPercent 2470490 attribute.

The MasterFixedAssetID 2470496 attribute is a MasterFixedAssetID 2470500 datatype. The MasterFixedAssetID 2470496 attribute has a cardinality of zero or one 2470498 meaning that for each instance of the CostSettlementRule 2470474 entity there may be one MasterFixedAssetID 2470496 attribute.

The FixedAssetID 2470502 attribute is a FixedAssetID 2470506 datatype. The FixedAssetID 2470502 attribute has a cardinality of zero or one 2470504 meaning that for each instance of the CostSettlementRule 2470474 entity there may be one FixedAssetID 2470502 attribute.

The InternalOrderID 2470508 attribute is an InternalOrderID 2470512 datatype. The InternalOrderID 2470508 attribute has a cardinality of zero or one 2470510 meaning that for each instance of the CostSettlementRule 2470474 entity there may be one InternalOrderID 2470508 attribute.

The MaintenanceOrderID 2470514 attribute is a MaintenanceOrderID 2470518 datatype. The MaintenanceOrderID 2470514 attribute has a cardinality of zero or one 2470516 meaning that for each instance of the CostSettlementRule 2470474 entity there may be one MaintenanceOrderID 2470514 attribute.

The CostCentreID 2470520 attribute is a CostCentreID 2470524 datatype. The CostCentreID 2470520 attribute has a cardinality of zero or one 2470522 meaning that for each instance of the CostSettlementRule 2470474 entity there may be one CostCentreID 2470520 attribute.

The ProjectNetworkID 2470526 attribute is a ProjectNetworkID 2470530 datatype. The ProjectNetworkID 2470526 attribute has a cardinality of zero or one 2470528 meaning that for each instance of the CostSettlementRule 2470474 entity there may be one ProjectNetworkID 2470526 attribute.

The ProjectActivityID 2470532 attribute is a ProjectActivityID 2470536 datatype. The ProjectActivityID 2470532 attribute has a cardinality of zero or one 2470534 meaning that for each instance of the CostSettlementRule 2470474 entity there may be one ProjectActivityID 2470532 attribute.

The ProjectWorkBreakdownStructureElementID 2470538 attribute is a ProjectWorkBreakdownStructureElementID 2470542 datatype. The ProjectWorkBreakdownStructureElementID 2470538 attribute has a cardinality of zero or one 2470540 meaning that for each instance of the CostSettlementRule 2470474 entity there may be one ProjectWorkBreakdownStructureElementID 2470538 attribute.

The GeneralLedgerAccountID 2470544 attribute is a GeneralLedgerAccountID 2470548 datatype. The GeneralLedgerAccountID 2470544 attribute has a cardinality of zero or one 2470546 meaning that for each instance of the CostSettlementRule 2470474 entity there may be one GeneralLedgerAccountID 2470544 attribute.

The ValidToFiscalYearID 2470550 attribute is a FiscalYearID 2470554 datatype. The ValidToFiscalYearID 2470550 attribute has a cardinality of zero or one 2470552 meaning that for each instance of the CostSettlementRule 2470474 entity there may be one ValidToFiscalYearID 2470550 attribute.

The ValidToAccountingPeriodID 2470556 attribute is an AccountingPeriodID 2470560 datatype. The ValidToAccountingPeriodID 2470556 attribute has a cardinality of zero or one 2470558 meaning that for each instance of the CostSettlementRule 2470474 entity there may be one ValidToAccountingPeriodID 2470556 attribute.

The ValidFromFiscalYearID 2470562 attribute is a FiscalYearID 2470566 datatype. The ValidFromFiscalYearID 2470562 attribute has a cardinality of zero or one 2470564 meaning that for each instance of the CostSettlementRule 2470474 entity there may be one ValidFromFiscalYearID 2470562 attribute.

The ValidFromAccountingPeriodID 2470568 attribute is an AccountingPeriodID 2470572 datatype. The ValidFromAccountingPeriodID 2470568 attribute has a cardinality of zero or one 2470570 meaning that for each instance of the CostSettlementRule 2470474 entity there may be one ValidFromAccountingPeriodID 2470568 attribute.

The Log 2470574 package is a Log 2470580 datatype. The Log 2470574 package includes a Log 2470576 entity.

The Log 2470576 entity has a cardinality of zero or one 2470578 meaning that for each instance of the MaintenanceOrderMessage 247002 entity there may be one Log 2470576 entity.

Message Data Type

FIGS. 248-1 through 248-12 show a MaintenanceOrderMessage 248000 package. The MaintenanceOrderMessage 248000 package is a <MessageDataType> 248004 datatype. The MaintenanceOrderMessage 248000 package includes a MaintenanceOrderMessage 248002 entity. The MaintenanceOrderMessage 248000 package includes various packages, namely MessageHeader 248006 and MaintenanceOrder 248028.

The MessageHeader 248006 package is a BusinessDocumentMessageHeader 248012 datatype. The MessageHeader 248006 package includes a MessageHeader 248008 entity.

The MessageHeader 248008 entity has a cardinality of one 248010 meaning that for each instance of the MaintenanceOrderMessage 248002 entity there is one MessageHeader 248008 entity. The MessageHeader 248008 entity includes various attributes, namely ID 248014 and CreationDateTime 248020.

The ID 248014 attribute is a BusinessDocumentMessageID 248018 datatype. The ID 248014 attribute has a cardinality of one 248616 meaning that for each instance of the MessageHeader 248008 entity there is one ID 248014 attribute.

The CreationDateTime 248020 attribute is a DateTime 248024 datatype. The CreationDateTime 248020 attribute has a cardinality of one 248022 meaning that for each instance of the MessageHeader 248008 entity there is one CreationDateTime 248020 attribute.

The MaintenanceOrder 248028 package includes a MaintenanceOrder 248030 entity. The MaintenanceOrder 248028 package includes various packages, namely Operation 2480118, Party 2480290 and CostSettlementRule 2480340.

The MaintenanceOrder 248030 entity has a cardinality of one 248032 meaning that for each instance of the MaintenanceOrderMessage 248002 entity there is one MaintenanceOrder 248030 entity. The MaintenanceOrder 248030 entity includes various attributes, namely ID 248034, AccountingBusinessAreaCode 248040, WorkCentreID 248046, WorkCentrePlantID 248052, MaintenancePlannerGroupCode 248058, InstallationPointID 248064, IndividualMaterialID 248070, MaterialID 248076, SerialID 248082, ImportanceCode 248088, Description 248094, TextCollection 2480100, RequestedExecutionPeriod 2480106 and EstimatedTotalAmount 2480112.

The ID 248034 attribute is a MaintenanceOrderID 248038 datatype. The ID 248034 attribute has a cardinality of one 248036 meaning that for each instance of the MaintenanceOrder 248030 entity there is one ID 248034 attribute.

The AccountingBusinessAreaCode 248040 attribute is an AccountingBusinessAreaCode 248044 datatype. The AccountingBusinessAreaCode 248040 attribute has a cardinality of zero or one 248042 meaning that for each instance of the MaintenanceOrder 248030 entity there may be one AccountingBusinessAreaCode 248040 attribute.

The WorkCentreID 248046 attribute is a WorkCentreID 248050 datatype. The WorkCentreID 248046 attribute has a cardinality of zero or one 248048 meaning that for each instance of the MaintenanceOrder 248030 entity there may be one WorkCentreID 248046 attribute.

The WorkCentrePlantID 248052 attribute is a PlantID 248056 datatype. The WorkCentrePlantID 248052 attribute has a cardinality of zero or one 248054 meaning that for each instance of the MaintenanceOrder 248030 entity there may be one WorkCentrePlantID 248052 attribute.

The MaintenancePlannerGroupCode 248058 attribute is a MaintenancePlannerGroupCode 248062 datatype. The MaintenancePlannerGroupCode 248058 attribute has a cardinality of zero or one 248060 meaning that for each instance of the MaintenanceOrder 248030 entity there may be one MaintenancePlannerGroupCode 248058 attribute.

The InstallationPointID 248064 attribute is an InstallationPointID 248068 datatype. The InstallationPointID 248064 attribute has a cardinality of zero or one 248066 meaning that for each instance of the MaintenanceOrder 248030 entity there may be one InstallationPointID 248064 attribute.

The IndividualMaterialID 248070 attribute is a ProductID 248074 datatype. The IndividualMaterialID 248070 attribute has a cardinality of zero or one 248072 meaning that for each instance of the MaintenanceOrder 248030 entity there may be one IndividualMaterialID 248070 attribute.

The MaterialID 248076 attribute is a ProductInternalID 248080 datatype. The MaterialID 248076 attribute has a cardinality of zero or one 248078 meaning that for each instance of the MaintenanceOrder 248030 entity there may be one MaterialID 248076 attribute.

The SerialID 248082 attribute is a SerialID 248086 datatype. The SerialID 248082 attribute has a cardinality of zero or one 248084 meaning that for each instance of the MaintenanceOrder 248030 entity there may be one SerialID 248082 attribute.

The ImportanceCode 248088 attribute is an ImportanceCode 248092 datatype. The ImportanceCode 248088 attribute has a cardinality of zero or one 248090 meaning that for each instance of the MaintenanceOrder 248030 entity there may be one ImportanceCode 248088 attribute.

The Description 248094 attribute is a SHORT_Description 248098 datatype. The Description 248094 attribute has a cardinality of zero or one 248096 meaning that for each instance of the MaintenanceOrder 248030 entity there may be one Description 248094 attribute.

The TextCollection 2480100 attribute is a TextCollection 2480104 datatype. The TextCollection 2480100 attribute has a cardinality of zero or one 2480102 meaning that for each instance of the MaintenanceOrder 248030 entity there may be one TextCollection 2480100 attribute.

The RequestedExecutionPeriod 2480106 attribute is an UPPEROPEN_TIMEZONEINDEPENDENT_ DateTimePeriod 2480110 datatype. The RequestedExecutionPeriod 2480106 attribute has a cardinality of zero or one 2480108 meaning that for each instance of the MaintenanceOrder 248030 entity there may be one RequestedExecutionPeriod 2480106 attribute.

The EstimatedTotalAmount 2480112 attribute is an Amount 2480116 datatype. The EstimatedTotalAmount 2480112 attribute has a cardinality of zero or one 2480114 meaning that for each instance of the MaintenanceOrder 248030 entity there may be one EstimatedTotalAmount 2480112 attribute.

The Operation 2480118 package includes an Operation 2480120 entity.

The Operation 2480120 entity has a cardinality of zero or n 2480122 meaning that for each instance of the MaintenanceOrder 248030 entity there may be one or more Operation 2480120 entities. The Operation 2480120 entity includes various attributes, namely ActionCode 2480124, ID 2480130, ActivityID 2480136, ControlProfileCode 2480142, WorkCentreID 2480148, WorkCentrePlantID 2480154, Description 2480160, TextCollection 2480166, CalculateOperationWorkloadComponentCode 2480172, ResourceClassID 2480178, WorkAgreementID 2480184, PlannedDurationQuantity 2480190, PlannedWorkQuantity 2480196, ForecastEndDateTime 2480202 and ForecastWorkQuantity 2480208. The Operation 2480120 entity includes a MaterialInput 2480214 subordinate entity.

The ActionCode 2480124 attribute is an ActionCode 2480128 datatype. The ActionCode 2480124 attribute has a cardinality of one 2480126 meaning that for each instance of the Operation 2480120 entity there is one ActionCode 2480124 attribute.

The ID 2480130 attribute is an OperationID 2480134 datatype. The ID 2480130 attribute has a cardinality of one 2480132 meaning that for each instance of the Operation 2480120 entity there is one ID 2480130 attribute.

The ActivityID 2480136 attribute is an OperationActivityID 2480140 datatype. The ActivityID 2480136 attribute has a cardinality of zero or one 2480138 meaning that for each instance of the Operation 2480120 entity there may be one ActivityID 2480136 attribute.

The ControlProfileCode 2480142 attribute is an OperationControlProfileCode 2480146 datatype. The ControlProfileCode 2480142 attribute has a cardinality of zero or one 2480144 meaning that for each instance of the Operation 2480120 entity there may be one ControlProfileCode 2480142 attribute.

The WorkCentreID 2480148 attribute is a WorkCentreID 2480152 datatype. The WorkCentreID 2480148 attribute has a cardinality of zero or one 2480150 meaning that for each instance of the Operation 2480120 entity there may be one WorkCentreID 2480148 attribute.

The WorkCentrePlantID 2480154 attribute is a PlantID 2480158 datatype. The WorkCentrePlantID 2480154 attribute has a cardinality of zero or one 2480156 meaning that for each instance of the Operation 2480120 entity there may be one WorkCentrePlantID 2480154 attribute.

The Description 2480160 attribute is a MEDIUM_Description 2480164 datatype. The Description 2480160 attribute has a cardinality of zero or one 2480162 meaning that for each instance of the Operation 2480120 entity there may be one Description 2480160 attribute.

The TextCollection 2480166 attribute is a TextCollection 2480170 datatype. The TextCollection 2480166 attribute has a cardinality of zero or one 2480168 meaning that for each instance of the Operation 2480120 entity there may be one TextCollection 2480166 attribute.

The CalculateOperationWorkloadComponentCode 2480172 attribute is an OperationWorkloadComponentCode 2480176 datatype. The CalculateOperationWorkloadComponentCode 2480172 attribute has a cardinality of zero or one 2480174 meaning that for each instance of the Operation 2480120 entity there may be one CalculateOperationWorkloadComponentCode 2480172 attribute.

The ResourceClassID 2480178 attribute is a ResourceClassID 2480182 datatype. The ResourceClassID 2480178 attribute has a cardinality of zero or one 2480180 meaning that for each instance of the Operation 2480120 entity there may be one ResourceClassID 2480178 attribute.

The WorkAgreementID 2480184 attribute is a WorkAgreementID 2480188 datatype. The WorkAgreementID 2480184 attribute has a cardinality of zero or one 2480186 meaning that for each instance of the Operation 2480120 entity there may be one WorkAgreementID 2480184 attribute.

The PlannedDurationQuantity 2480190 attribute is a Quantity 2480194 datatype. The PlannedDurationQuantity 2480190 attribute has a cardinality of zero or one 2480192 meaning that for each instance of the Operation 2480120 entity there may be one PlannedDurationQuantity 2480190 attribute.

The PlannedWorkQuantity 2480196 attribute is a Quantity 2480200 datatype. The PlannedWorkQuantity 2480196 attribute has a cardinality of zero or one 2480198 meaning that for each instance of the Operation 2480120 entity there may be one PlannedWorkQuantity 2480196 attribute.

The ForecastEndDateTime 2480202 attribute is an UPPEROPEN_TIMEZONEINDEPENDENT_ DateTimePeriod 2480206 datatype. The ForecastEndDateTime 2480202 attribute has a cardinality of zero or one 2480204 meaning that for each instance of the Operation 2480120 entity there may be one ForecastEndDateTime 2480202 attribute.

The ForecastWorkQuantity 2480208 attribute is a Quantity 2480212 datatype. The ForecastWorkQuantity 2480208 attribute has a cardinality of zero or one 2480210 meaning that for each instance of the Operation 2480120 entity there may be one ForecastWorkQuantity 2480208 attribute.

The MaterialInput 2480214 entity has a cardinality of zero or n 2480216 meaning that for each instance of the Operation 2480120 entity there may be one or more MaterialInput 2480214 entities. The MaterialInput 2480214 entity includes various attributes, namely ActionCode 2480218, ReservationID 2480224, ReservationItemID 2480230, GoodsMovementAllowedIndicator 2480236, MaterialID 2480242, PlantID 2480248, InventoryManagedLocationID 2480254, Description 2480260, TextCollection 2480266, LogisticsConfirmationMethodCode 2480272, RequirementQuantity 2480278 and ProcurementEffectivenessConditionCode 2480284.

The ActionCode 2480218 attribute is an ActionCode 2480222 datatype. The ActionCode 2480218 attribute has a cardinality of one 2480220 meaning that for each instance of the MaterialInput 2480214 entity there is one ActionCode 2480218 attribute.

The ReservationID 2480224 attribute is a ReservationID 2480228 datatype. The ReservationID 2480224 attribute has a cardinality of zero or one 2480226 meaning that for each instance of the MaterialInput 2480214 entity there may be one ReservationID 2480224 attribute.

The ReservationItemID 2480230 attribute is a ReservationItemID 2480234 datatype. The ReservationItemID 2480230 attribute has a cardinality of zero or one 2480232 meaning that for each instance of the MaterialInput 2480214 entity there may be one ReservationItemID 2480230 attribute.

The GoodsMovementAllowedIndicator 2480236 attribute is an Indicator 2480240 datatype. The GoodsMovementAllowedIndicator 2480236 attribute has a cardinality of zero or one 2480238 meaning that for each instance of the MaterialInput 2480214 entity there may be one GoodsMovementAllowedIndicator 2480236 attribute.

The MaterialID 2480242 attribute is a ProductInternalID 2480246 datatype. The MaterialID 2480242 attribute has a cardinality of zero or one 2480244 meaning that for each instance of the MaterialInput 2480214 entity there may be one MaterialID 2480242 attribute.

The PlantID 2480248 attribute is a PlantID 2480252 datatype. The PlantID 2480248 attribute has a cardinality of zero or one 2480250 meaning that for each instance of the MaterialInput 2480214 entity there may be one PlantID 2480248 attribute.

The InventoryManagedLocationID 2480254 attribute is a LocationInternalID 2480258 datatype. The InventoryManagedLocationID 2480254 attribute has a cardinality of zero or one 2480256 meaning that for each instance of the MaterialInput 2480214 entity there may be one InventoryManagedLocationID 2480254 attribute.

The Description 2480260 attribute is a SHORT_Description 2480264 datatype. The Description 2480260 attribute has a cardinality of zero or one 2480262 meaning that for each instance of the MaterialInput 2480214 entity there may be one Description 2480260 attribute.

The TextCollection 2480266 attribute is a TextCollection 2480270 datatype. The TextCollection 2480266 attribute has a cardinality of zero or one 2480268 meaning that for each instance of the MaterialInput 2480214 entity there may be one TextCollection 2480266 attribute.

The LogisticsConfirmationMethodCode 2480272 attribute is a LogisticsConfirmationMethodCode 2480276 datatype. The LogisticsConfirmationMethodCode 2480272 attribute has a cardinality of zero or one 2480274 meaning that for each instance of the MaterialInput 2480214 entity there may be one LogisticsConfirmationMethodCode 2480272 attribute.

The RequirementQuantity 2480278 attribute is a Quantity 2480282 datatype. The RequirementQuantity 2480278 attribute has a cardinality of zero or one 2480280 meaning that for each instance of the MaterialInput 2480214 entity there may be one RequirementQuantity 2480278 attribute.

The ProcurementEffectivenessConditionCode 2480284 attribute is a ProcurementEffectivenessConditionCode 2480288 datatype. The ProcurementEffectivenessConditionCode 2480284 attribute has a cardinality of zero or one 2480286 meaning that for each instance of the MaterialInput 2480214 entity there may be one ProcurementEffectivenessConditionCode 2480284 attribute.

The Party 2480290 package includes various entities, namely ProductRecipientParty 2480292, VendorParty 2480308 and ResponsibleEmployeeParty 2480324.

The ProductRecipientParty 2480292 entity has a cardinality of zero or n 2480294 meaning that for each instance of the MaintenanceOrder 248030 entity there may be one or more ProductRecipientParty 2480292 entities. The ProductRecipientParty 2480292 entity includes various attributes, namely ActionCode 2480296 and ProductRecipientParty 2480302.

The ActionCode 2480296 attribute is an ActionCode 2480300 datatype. The ActionCode 2480296 attribute has a cardinality of one 2480298 meaning that for each instance of the ProductRecipientParty 2480292 entity there is one ActionCode 2480296 attribute.

The ProductRecipientParty 2480302 attribute is a PartyInternalID 2480306 datatype. The ProductRecipientParty 2480302 attribute has a cardinality of one 2480304 meaning that for each instance of the ProductRecipientParty 2480292 entity there is one ProductRecipientParty 2480302 attribute.

The VendorParty 2480308 entity has a cardinality of zero or n 2480310 meaning that for each instance of the MaintenanceOrder 248030 entity there may be one or more VendorParty 2480308 entities. The VendorParty 2480308 entity includes various attributes, namely ActionCode 2480312 and VendorParty 2480318.

The ActionCode 2480312 attribute is an ActionCode 2480316 datatype. The ActionCode 2480312 attribute has a cardinality of one 2480314 meaning that for each instance of the VendorParty 2480308 entity there is one ActionCode 2480312 attribute.

The VendorParty 2480318 attribute is a PartyInternalID 2480322 datatype. The VendorParty 2480318 attribute has a cardinality of one 2480320 meaning that for each instance of the VendorParty 2480308 entity there is one VendorParty 2480318 attribute.

The ResponsibleEmployeeParty 2480324 entity has a cardinality of zero or n 2480326 meaning that for each instance of the MaintenanceOrder 248030 entity there may be one or more ResponsibleEmployeeParty 2480324 entities. The ResponsibleEmployeeParty 2480324 entity includes various attributes, namely ActionCode 2480328 and ResponsibleEmployeeParty 2480334.

The ActionCode 2480328 attribute is an ActionCode 2480332 datatype. The ActionCode 2480328 attribute has a cardinality of one 2480330 meaning that for each instance of the ResponsibleEmployeeParty 2480324 entity there is one ActionCode 2480328 attribute.

The ResponsibleEmployeeParty 2480334 attribute is a PartyInternalID 2480338 datatype. The ResponsibleEmployeeParty 2480334 attribute has a cardinality of one 2480336 meaning that for each instance of the ResponsibleEmployeeParty 2480324 entity there is one ResponsibleEmployeeParty 2480334 attribute.

The CostSettlementRule 2480340 package includes a CostSettlementRule 2480342 entity.

The CostSettlementRule 2480342 entity has a cardinality of zero or n 2480344 meaning that for each instance of the MaintenanceOrder 248030 entity there may be one or more CostSettlementRule 2480342 entities. The CostSettlementRule 2480342 entity includes various attributes, namely ActionCode 2480346, OrdinalNumberValue 2480352, ControllingSettlementTypeCode 2480358, AssignmentPercent 2480364, MasterFixedAssetID 2480370, FixedAssetID 2480376, InternalOrderID 2480382, MaintenanceOrderID 2480388, CostCentreID 2480394, ProjectNetworkID 2480400, ProjectActivityID 2480406, ProjectWorkBreakdownStructureElementID 2480412, GeneralLedgerAccountID 2480418, ValidToFiscalYearID 2480424, ValidToAccountingPeriodID 2480430, ValidFromFiscalYearID 2480436 and ValidFromAccountingPeriodID 2480442.

The ActionCode 2480346 attribute is an ActionCode 2480350 datatype. The ActionCode 2480346 attribute has a cardinality of one 2480348 meaning that for each instance of the CostSettlementRule 2480342 entity there is one ActionCode 2480346 attribute.

The OrdinalNumberValue 2480352 attribute is an OrdinalNumberValue 2480356 datatype. The OrdinalNumberValue 2480352 attribute has a cardinality of one 2480354 meaning that for each instance of the CostSettlementRule 2480342 entity there is one OrdinalNumberValue 2480352 attribute.

The ControllingSettlementTypeCode 2480358 attribute is a ControllingSettlementTypeCode 2480362 datatype. The ControllingSettlementTypeCode 2480358 attribute has a cardinality of zero or one 2480360 meaning that for each instance of the CostSettlementRule 2480342 entity there may be one ControllingSettlementTypeCode 2480358 attribute.

The AssignmentPercent 2480364 attribute is a Percent 2480368 datatype. The AssignmentPercent 2480364 attribute has a cardinality of zero or one 2480366 meaning that for each instance of the CostSettlementRule 2480342 entity there may be one AssignmentPercent 2480364 attribute.

The MasterFixedAssetID 2480370 attribute is a MasterFixedAssetID 2480374 datatype. The MasterFixedAssetID 2480370 attribute has a cardinality of zero or one 2480372 meaning that for each instance of the CostSettlementRule 2480342 entity there may be one MasterFixedAssetID 2480370 attribute.

The FixedAssetID 2480376 attribute is a FixedAssetID 2480380 datatype. The FixedAssetID 2480376 attribute has a cardinality of zero or one 2480378 meaning that for each instance of the CostSettlementRule 2480342 entity there may be one FixedAssetID 2480376 attribute.

The InternalOrderID 2480382 attribute is an InternalOrderID 2480386 datatype. The InternalOrderID 2480382 attribute has a cardinality of zero or one 2480384 meaning that for each instance of the CostSettlementRule 2480342 entity there may be one InternalOrderID 2480382 attribute.

The MaintenanceOrderID 2480388 attribute is a MaintenanceOrderID 2480392 datatype. The MaintenanceOrderID 2480388 attribute has a cardinality of zero or one 2480390 meaning that for each instance of the CostSettlementRule 2480342 entity there may be one MaintenanceOrderID 2480388 attribute.

The CostCentreID 2480394 attribute is a CostCentreID 2480398 datatype. The CostCentreID 2480394 attribute has a cardinality of zero or one 2480396 meaning that for each instance of the CostSettlementRule 2480342 entity there may be one CostCentreID 2480394 attribute.

The ProjectNetworkID 2480400 attribute is a ProjectNetworkID 2480404 datatype. The ProjectNetworkID 2480400 attribute has a cardinality of zero or one 2480402 meaning that for each instance of the CostSettlementRule 2480342 entity there may be one ProjectNetworkID 2480400 attribute.

The ProjectActivityID 2480406 attribute is a ProjectActivityID 2480410 datatype. The ProjectActivityID 2480406 attribute has a cardinality of zero or one 2480408 meaning that for each instance of the CostSettlementRule 2480342 entity there may be one ProjectActivityID 2480406 attribute.

The ProjectWorkBreakdownStructureElementID 2480412 attribute is a ProjectWorkBreakdownStructureElementID 2480416 datatype. The ProjectWorkBreakdownStructureElementID 2480412 attribute has a cardinality of zero or one 2480414 meaning that for each instance of the CostSettlementRule 2480342 entity there may be one ProjectWorkBreakdownStructureElementID 2480412 attribute.

The GeneralLedgerAccountID 2480418 attribute is a GeneralLedgerAccountID 2480422 datatype. The GeneralLedgerAccountID 2480418 attribute has a cardinality of zero or one 2480420 meaning that for each instance of the Cost- SettlementRule 2480342 entity there may be one GeneralLedgerAccountID 2480418 attribute.

The ValidToFiscalYearID 2480424 attribute is a FiscalYearID 2480428 datatype. The ValidToFiscalYearID 2480424 attribute has a cardinality of zero or one 2480426 meaning that for each instance of the CostSettlementRule 2480342 entity there may be one ValidToFiscalYearID 2480424 attribute.

The ValidToAccountingPeriodID 2480430 attribute is an AccountingPeriodID 2480434 datatype. The ValidToAccountingPeriodID 2480430 attribute has a cardinality of zero or one 2480432 meaning that for each instance of the CostSettlementRule 2480342 entity there may be one ValidToAccountingPeriodID 2480430 attribute.

The ValidFromFiscalYearID 2480436 attribute is a FiscalYearID 2480440 datatype. The ValidFromFiscalYearID 2480436 attribute has a cardinality of zero or one 2480438 meaning that for each instance of the CostSettlementRule 2480342 entity there may be one ValidFromFiscalYearID 2480436 attribute.

The ValidFromAccountingPeriodID 2480442 attribute is an AccountingPeriodID 2480446 datatype. The ValidFromAccountingPeriodID 2480442 attribute has a cardinality of zero or one 2480444 meaning that for each instance of the CostSettlementRule 2480342 entity there may be one ValidFromAccountingPeriodID 2480442 attribute.

Message Data Type

FIGS. 250-1 through 250-12 show a MaintenanceOrderMessage 250000 package. The MaintenanceOrderMessage 250000 package is a <MessageDataType> 250004 datatype. The MaintenanceOrderMessage 250000 package includes a MaintenanceOrderMessage 250002 entity. The MaintenanceOrderMessage 250000 package includes various packages, namely MessageHeader 250006 and MaintenanceOrder 250028.

The MessageHeader 250006 package is a BusinessDocumentMessageHeader 250012 datatype. The MessageHeader 250006 package includes a MessageHeader 250008 entity.

The MessageHeader 250008 entity has a cardinality of one 250010 meaning that for each instance of the MaintenanceOrderMessage 250002 entity there is one MessageHeader 250008 entity. The MessageHeader 250008 entity includes various attributes, namely ID 250014 and CreationDateTime 250020.

The ID 250014 attribute is a BusinessDocumentMessageID 250018 datatype. The ID 250014 attribute has a cardinality of one 250016 meaning that for each instance of the MessageHeader 250008 entity there is one ID 250014 attribute.

The CreationDateTime 250020 attribute is a DateTime 250024 datatype. The CreationDateTime 250020 attribute has a cardinality of one 250022 meaning that for each instance of the MessageHeader 250008 entity there is one CreationDateTime 250020 attribute.

The MaintenanceOrder 250028 package includes a MaintenanceOrder 250030 entity. The MaintenanceOrder 250028 package includes various packages, namely Operation 2500130, Party 2500260 and CostSettlementRule 2500292.

The MaintenanceOrder 250030 entity has a cardinality of one 250032 meaning that for each instance of the MaintenanceOrderMessage 250002 entity there is one MaintenanceOrder 250030 entity. The MaintenanceOrder 250030 entity includes various attributes, namely TypeCode 250034, MaintenancePlanningPlantID 250040, AccountingBusinessAreaCode 250046, WorkCentreID 250052, WorkCentrePlantID 250058, MaintenancePlannerGroupCode 250064, InstallationPointID 250070, IndividualMaterialID 250076, MaterialID 250082, SerialID 250088, ImportanceCode 250094, Description 2500100, TextCollection 2500106, MaintenanceRequestID 2500112, RequestedExecutionPeriod 2500118 and EstimatedTotalAmount 2500124.

The TypeCode 250034 attribute is a MaintenanceOrderTypeCode 250038 datatype. The TypeCode 250034 attribute has a cardinality of one 250036 meaning that for each instance of the MaintenanceOrder 250030 entity there is one TypeCode 250034 attribute.

The MaintenancePlanningPlantID 250040 attribute is a PlantID 250044 datatype. The MaintenancePlanningPlantID 250040 attribute has a cardinality of zero or one 250042 meaning that for each instance of the MaintenanceOrder 250030 entity there may be one MaintenancePlanningPlantID 250040 attribute.

The AccountingBusinessAreaCode 250046 attribute is an AccountingBusinessAreaCode 250050 datatype. The AccountingBusinessAreaCode 250046 attribute has a cardinality of zero or one 250048 meaning that for each instance of the MaintenanceOrder 250030 entity there may be one AccountingBusinessAreaCode 250046 attribute.

The WorkCentreID 250052 attribute is a WorkCentreID 250056 datatype. The WorkCentreID 250052 attribute has a cardinality of zero or one 250054 meaning that for each instance of the MaintenanceOrder 250030 entity there may be one WorkCentreID 250052 attribute.

The WorkCentrePlantID 250058 attribute is a PlantID 250062 datatype. The WorkCentrePlantID 250058 attribute has a cardinality of zero or one 250060 meaning that for each instance of the MaintenanceOrder 250030 entity there may be one WorkCentrePlantID 250058 attribute.

The MaintenancePlannerGroupCode 250064 attribute is a MaintenancePlannerGroupCode 250068 datatype. The MaintenancePlannerGroupCode 250064 attribute has a cardinality of zero or one 250066 meaning that for each instance of the MaintenanceOrder 250030 entity there may be one MaintenancePlannerGroupCode 250064 attribute.

The InstallationPointID 250070 attribute is an InstallationPointID 250074 datatype. The InstallationPointID 250070 attribute has a cardinality of zero or one 250072 meaning that for each instance of the MaintenanceOrder 250030 entity there may be one InstallationPointID 250070 attribute.

The IndividualMaterialID 250076 attribute is a ProductID 250080 datatype. The IndividualMaterialID 250076 attribute has a cardinality of zero or one 250078 meaning that for each instance of the MaintenanceOrder 250030 entity there may be one IndividualMaterialID 250076 attribute.

The MaterialID 250082 attribute is a ProductInternalID 250086 datatype. The MaterialID 250082 attribute has a cardinality of zero or one 250084 meaning that for each instance of the MaintenanceOrder 250030 entity there may be one MaterialID 250082 attribute.

The SerialID 250088 attribute is a SerialID 250092 datatype. The SerialID 250088 attribute has a cardinality of zero or one 250090 meaning that for each instance of the MaintenanceOrder 250030 entity there may be one SerialID 250088 attribute.

The ImportanceCode 250094 attribute is an ImportanceCode 250098 datatype. The ImportanceCode 250094 attribute has a cardinality of zero or one 250096 meaning that for each instance of the MaintenanceOrder 250030 entity there may be one ImportanceCode 250094 attribute.

The Description 2500100 attribute is a SHORT_Description 2500104 datatype. The Description 2500100 attribute has a cardinality of zero or one 2500102 meaning that for each instance of the MaintenanceOrder 250030 entity there may be one Description 2500100 attribute.

The TextCollection 2500106 attribute is a TextCollection 2500110 datatype. The TextCollection 2500106 attribute has a cardinality of zero or one 2500108 meaning that for each instance of the MaintenanceOrder 250030 entity there may be one TextCollection 2500106 attribute.

The MaintenanceRequestID 2500112 attribute is a MaintenanceRequestID 2500116 datatype. The MaintenanceRequestID 2500112 attribute has a cardinality of zero or one 2500114 meaning that for each instance of the MaintenanceOrder 250030 entity there may be one MaintenanceRequestID 2500112 attribute.

The RequestedExecutionPeriod 2500118 attribute is an UPPEROPEN_TIMEZONEINDEPENDENT_ DateTimePeriod 2500122 datatype. The RequestedExecutionPeriod 2500118 attribute has a cardinality of zero or one 2500120 meaning that for each instance of the MaintenanceOrder 250030 entity there may be one RequestedExecutionPeriod 2500118 attribute.

The EstimatedTotalAmount 2500124 attribute is an Amount 2500128 datatype. The EstimatedTotalAmount 2500124 attribute has a cardinality of zero or one 2500126 meaning that for each instance of the MaintenanceOrder 250030 entity there may be one EstimatedTotalAmount 2500124 attribute.

The Operation 2500130 package includes an Operation 2500132 entity.

The Operation 2500132 entity has a cardinality of zero or n 2500134 meaning that for each instance of the MaintenanceOrder 250030 entity there may be one or more Operation 2500132 entities. The Operation 2500132 entity includes various attributes, namely ID 2500136, ActivityID 2500142, ControlProfileCode 2500148, WorkCentreID 2500154, WorkCentrePlantID 2500160, Description 2500166, TextCollection 2500172, CalculateOperationWorkloadComponentCode 2500178, ResourceClassID 2500184, WorkAgreementID 2500190, PlannedDurationQuantity 2500196 and PlannedWorkQuantity 2500202. The Operation 2500132 entity includes a MaterialInput 2500208 subordinate entity.

The ID 2500136 attribute is an OperationID 2500140 datatype. The ID 2500136 attribute has a cardinality of one 2500138 meaning that for each instance of the Operation 2500132 entity there is one ID 2500136 attribute.

The ActivityID 2500142 attribute is an OperationActivityID 2500146 datatype. The ActivityID 2500142 attribute has a cardinality of zero or one 2500144 meaning that for each instance of the Operation 2500132 entity there may be one ActivityID 2500142 attribute.

The ControlProfileCode 2500148 attribute is an OperationControlProfileCode 2500152 datatype. The ControlProfileCode 2500148 attribute has a cardinality of zero or one 2500150 meaning that for each instance of the Operation 2500132 entity there may be one ControlProfileCode 2500148 attribute.

The WorkCentreID 2500154 attribute is a WorkCentreID 2500158 datatype. The WorkCentreID 2500154 attribute has a cardinality of zero or one 2500156 meaning that for each instance of the Operation 2500132 entity there may be one WorkCentreID 2500154 attribute.

The WorkCentrePlantID 2500160 attribute is a PlantID 2500164 datatype. The WorkCentrePlantID 2500160 attribute has a cardinality of zero or one 2500162 meaning that for each instance of the Operation 2500132 entity there may be one WorkCentrePlantID 2500160 attribute.

The Description 2500166 attribute is a MEDIUM_Description 2500170 datatype. The Description 2500166 attribute has a cardinality of zero or one 2500168 meaning that for each instance of the Operation 2500132 entity there may be one Description 2500166 attribute.

The TextCollection 2500172 attribute is a TextCollection 2500176 datatype. The TextCollection 2500172 attribute has a cardinality of zero or one 2500174 meaning that for each instance of the Operation 2500132 entity there may be one TextCollection 2500172 attribute.

The CalculateOperationWorkloadComponentCode 2500178 attribute is an OperationWorkloadComponentCode 2500182 datatype. The CalculateOperationWorkloadComponentCode 2500178 attribute has a cardinality of zero or one 2500180 meaning that for each instance of the Operation 2500132 entity there may be one CalculateOperationWorkloadComponentCode 2500178 attribute.

The ResourceClassID 2500184 attribute is a ResourceClassID 2500188 datatype. The ResourceClassID 2500184 attribute has a cardinality of zero or one 2500186 meaning that for each instance of the Operation 2500132 entity there may be one ResourceClassID 2500184 attribute.

The WorkAgreementID 2500190 attribute is a WorkAgreementID 2500194 datatype. The WorkAgreementID 2500190 attribute has a cardinality of zero or one 2500192 meaning that for each instance of the Operation 2500132 entity there may be one WorkAgreementID 2500190 attribute.

The PlannedDurationQuantity 2500196 attribute is a Quantity 2500200 datatype. The PlannedDurationQuantity 2500196 attribute has a cardinality of zero or one 2500198 meaning that for each instance of the Operation 2500132 entity there may be one PlannedDurationQuantity 2500196 attribute.

The PlannedWorkQuantity 2500202 attribute is a Quantity 2500206 datatype. The PlannedWorkQuantity 2500202 attribute has a cardinality of zero or one 2500204 meaning that for each instance of the Operation 2500132 entity there may be one PlannedWorkQuantity 2500202 attribute.

The MaterialInput 2500208 entity has a cardinality of zero or n 2500210 meaning that for each instance of the Operation 2500132 entity there may be one or more MaterialInput 2500208 entities. The MaterialInput 2500208 entity includes various attributes, namely GoodsMovementAllowedIndicator 2500212, MaterialID 2500218, PlantID 2500224, InventoryManagedLocationID 2500230, Description 2500236, LogisticsConfirmationMethodCode 2500242, RequirementQuantity 2500248 and ProcurementEffectivenessConditionCode 2500254.

The GoodsMovementAllowedIndicator 2500212 attribute is an Indicator 2500216 datatype. The GoodsMovementAllowedIndicator 2500212 attribute has a cardinality of zero or one 2500214 meaning that for each instance of the MaterialInput 2500208 entity there may be one GoodsMovementAllowedIndicator 2500212 attribute.

The MaterialID 2500218 attribute is a ProductInternalID 2500222 datatype. The MaterialID 2500218 attribute has a cardinality of zero or one 2500220 meaning that for each instance of the MaterialInput 2500208 entity there may be one MaterialID 2500218 attribute.

The PlantID 2500224 attribute is a PlantID 2500228 datatype. The PlantID 2500224 attribute has a cardinality of zero or one 2500226 meaning that for each instance of the MaterialInput 2500208 entity there may be one PlantID 2500224 attribute.

The InventoryManagedLocationID 2500230 attribute is a LocationInternalID 2500234 datatype. The InventoryManagedLocationID 2500230 attribute has a cardinality of zero or one 2500232 meaning that for each instance of the MaterialInput 2500208 entity there may be one InventoryManagedLocationID 2500230 attribute.

The Description 2500236 attribute is a SHORT_Description 2500240 datatype. The Description 2500236 attribute has a cardinality of zero or one 2500238 meaning that for each instance of the MaterialInput 2500208 entity there may be one Description 2500236 attribute.

The LogisticsConfirmationMethodCode 2500242 attribute is a LogisticsConfirmationMethodCode 2500246 datatype. The LogisticsConfirmationMethodCode 2500242 attribute has a cardinality of zero or one 2500244 meaning that for each instance of the MaterialInput 2500208 entity there may be one LogisticsConfirmationMethodCode 2500242 attribute.

The RequirementQuantity 2500248 attribute is a Quantity 2500252 datatype. The RequirementQuantity 2500248 attribute has a cardinality of zero or one 2500250 meaning that for each instance of the MaterialInput 2500208 entity there may be one RequirementQuantity 2500248 attribute.

The ProcurementEffectivenessConditionCode 2500254 attribute is a ProcurementEffectivenessConditionCode 2500258 datatype. The ProcurementEffectivenessConditionCode 2500254 attribute has a cardinality of zero or one 2500256 meaning that for each instance of the MaterialInput 2500208 entity there may be one ProcurementEffectivenessConditionCode 2500254 attribute.

The Party 2500260 package includes various entities, namely ProductRecipientParty 2500262, VendorParty 2500272 and ResponsibleEmployeeParty 2500282.

The ProductRecipientParty 2500262 entity has a cardinality of zero or n 2500264 meaning that for each instance of the MaintenanceOrder 250030 entity there may be one or more ProductRecipientParty 2500262 entities. The ProductRecipientParty 2500262 entity includes a ProductRecipientParty 2500266 attribute.

The ProductRecipientParty 2500266 attribute is a PartyInternalID 2500270 datatype. The ProductRecipientParty 2500266 attribute has a cardinality of zero or one 2500268 meaning that for each instance of the ProductRecipientParty 2500262 entity there may be one ProductRecipientParty 2500266 attribute.

The VendorParty 2500272 entity has a cardinality of zero or n 2500274 meaning that for each instance of the MaintenanceOrder 250030 entity there may be one or more VendorParty 2500272 entities. The VendorParty 2500272 entity includes a VendorParty 2500276 attribute.

The VendorParty 2500276 attribute is a PartyInternalID 2500280 datatype. The VendorParty 2500276 attribute has a cardinality of zero or one 2500278 meaning that for each instance of the VendorParty 2500272 entity there may be one VendorParty 2500276 attribute.

The ResponsibleEmployeeParty 2500282 entity has a cardinality of zero or n 2500284 meaning that for each instance of the MaintenanceOrder 250030 entity there may be one or more ResponsibleEmployeeParty 2500282 entities. The ResponsibleEmployeeParty 2500282 entity includes a ResponsibleEmployeeParty 2500286 attribute.

The ResponsibleEmployeeParty 2500286 attribute is a PartyInternalID 2500290 datatype. The ResponsibleEmployeeParty 2500286 attribute has a cardinality of zero or one 2500288 meaning that for each instance of the ResponsibleEmployeeParty 2500282 entity there may be one ResponsibleEmployeeParty 2500286 attribute.

The CostSettlementRule 2500292 package includes a CostSettlementRule 2500294 entity.

The CostSettlementRule 2500294 entity has a cardinality of zero or n 2500296 meaning that for each instance of the MaintenanceOrder 250030 entity there may be one or more CostSettlementRule 2500294 entities. The CostSettlementRule 2500294 entity includes various attributes, namely OrdinalNumberValue 2500298, ControllingSettlementTypeCode 2500304, AssignmentPercent 2500310, MasterFixedAssetID 2500316, FixedAssetID 2500322, InternalOrderID 2500328, MaintenanceOrderID 2500334, CostCentreID 2500340, ProjectNetworkID 2500346, ProjectActivityID 2500352, ProjectWorkBreakdownStructureElementID 2500358, GeneralLedgerAccountID 2500364, ValidToFiscalYearID 2500370, ValidToAccountingPeriodID 2500376, ValidFromFiscalYearID 2500382 and ValidFromAccountingPeriodID 2500388.

The OrdinalNumberValue 2500298 attribute is an OrdinalNumberValue 2500302 datatype. The OrdinalNumberValue 2500298 attribute has a cardinality of one 2500300 meaning that for each instance of the CostSettlementRule 2500294 entity there is one OrdinalNumberValue 2500298 attribute.

The ControllingSettlementTypeCode 2500304 attribute is a ControllingSettlementTypeCode 2500308 datatype. The ControllingSettlementTypeCode 2500304 attribute has a cardinality of zero or one 2500306 meaning that for each instance of the CostSettlementRule 2500294 entity there may be one ControllingSettlementTypeCode 2500304 attribute.

The AssignmentPercent 2500310 attribute is a Percent 2500314 datatype. The AssignmentPercent 2500310 attribute has a cardinality of zero or one 2500312 meaning that for each instance of the CostSettlementRule 2500294 entity there may be one AssignmentPercent 2500310 attribute.

The MasterFixedAssetID 2500316 attribute is a MasterFixedAssetID 2500320 datatype. The MasterFixedAssetID 2500316 attribute has a cardinality of zero or one 2500318 meaning that for each instance of the CostSettlementRule 2500294 entity there may be one MasterFixedAssetID 2500316 attribute.

The FixedAssetID 2500322 attribute is a FixedAssetID 2500326 datatype. The FixedAssetID 2500322 attribute has a cardinality of zero or one 2500324 meaning that for each instance of the CostSettlementRule 2500294 entity there may be one FixedAssetID 2500322 attribute.

The InternalOrderID 2500328 attribute is an InternalOrderID 2500332 datatype. The InternalOrderID 2500328 attribute has a cardinality of zero or one 2500330 meaning that for each instance of the CostSettlementRule 2500294 entity there may be one InternalOrderID 2500328 attribute.

The MaintenanceOrderID 2500334 attribute is a MaintenanceOrderID 2500338 datatype. The MaintenanceOrderID 2500334 attribute has a cardinality of zero or one 2500336 meaning that for each instance of the CostSettlementRule 2500294 entity there may be one MaintenanceOrderID 2500334 attribute.

The CostCentreID 2500340 attribute is a CostCentreID 2500344 datatype. The CostCentreID 2500340 attribute has a cardinality of zero or one 2500342 meaning that for each instance of the CostSettlementRule 2500294 entity there may be one CostCentreID 2500340 attribute.

The ProjectNetworkID 2500346 attribute is a ProjectNetworkID 2500350 datatype. The ProjectNetworkID 2500346 attribute has a cardinality of zero or one 2500348 meaning that for each instance of the CostSettlementRule 2500294 entity there may be one ProjectNetworkID 2500346 attribute.

The ProjectActivityID 2500352 attribute is a ProjectActivityID 2500356 datatype. The ProjectActivityID 2500352 attribute has a cardinality of zero or one 2500354 meaning that for each instance of the CostSettlementRule 2500294 entity there may be one ProjectActivityID 2500352 attribute.

The ProjectWorkBreakdownStructureElementID 2500358 attribute is a ProjectWorkBreakdownStructureElementID 2500362 datatype. The ProjectWorkBreakdownStructureElementID 2500358 attribute has a cardinality of zero or one 2500360 meaning that for each instance of the CostSettlementRule 2500294 entity there may be one ProjectWorkBreakdownStructureElementID 2500358 attribute.

The GeneralLedgerAccountID 2500364 attribute is a GeneralLedgerAccountID 2500368 datatype. The GeneralLedgerAccountID 2500364 attribute has a cardinality of zero or one 2500366 meaning that for each instance of the CostSettlementRule 2500294 entity there may be one GeneralLedgerAccountID 2500364 attribute.

The ValidToFiscalYearID 2500370 attribute is a FiscalYearID 2500374 datatype. The ValidToFiscalYearID 2500370 attribute has a cardinality of zero or one 2500372 meaning that for each instance of the CostSettlementRule 2500294 entity there may be one ValidToFiscalYearID 2500370 attribute.

The ValidToAccountingPeriodID 2500376 attribute is an AccountingPeriodID 2500380 datatype. The ValidToAccountingPeriodID 2500376 attribute has a cardinality of zero or one 2500378 meaning that for each instance of the CostSettlementRule 2500294 entity there may be one ValidToAccountingPeriodID 2500376 attribute.

The ValidFromFiscalYearID 2500382 attribute is a FiscalYearID 2500386 datatype. The ValidFromFiscalYearID 2500382 attribute has a cardinality of zero or one 2500384 meaning that for each instance of the CostSettlementRule 2500294 entity there may be one ValidFromFiscalYearID 2500382 attribute.

The ValidFromAccountingPeriodID 2500388 attribute is an AccountingPeriodID 2500392 datatype. The ValidFromAccountingPeriodID 2500388 attribute has a cardinality of zero or one 2500390 meaning that for each instance of the CostSettlementRule 2500294 entity there may be one ValidFromAccountingPeriodID 2500388 attribute.

Message Data Type

FIG. 252 shows a MaintenanceOrderMessage 252000 package. The MaintenanceOrderMessage 252000 package is a <MessageDataType> 252004 datatype. The MaintenanceOrderMessage 252000 package includes a MaintenanceOrderMessage 252002 entity. The MaintenanceOrderMessage 252000 package includes various packages, namely MessageHeader 252006, MaintenanceOrder 252028 and Log 252046.

The MessageHeader 252006 package is a BusinessDocumentMessageHeader 252012 datatype. The MessageHeader 252006 package includes a MessageHeader 252008 entity.

The MessageHeader 252008 entity has a cardinality of one 252010 meaning that for each instance of the MaintenanceOrderMessage 252002 entity there is one MessageHeader 252008 entity. The MessageHeader 252008 entity includes various attributes, namely ID 252014 and Creatio-DateTime 252020.

The ID 252014 attribute is a BusinessDocumentMessageID 252018 datatype. The ID 252014 attribute has a cardinality of one 252016 meaning that for each instance of the MessageHeader 252008 entity there is one ID 252014 attribute.

The Creatio-DateTime 252020 attribute is a DateTime 252024 datatype. The Creatio-DateTime 252020 attribute has a cardinality of one 252022 meaning that for each instance of the MessageHeader 252008 entity there is one Creatio-DateTime 252020 attribute.

The MaintenanceOrder 252028 package includes a MaintenanceOrder 252030 entity.

The MaintenanceOrder 252030 entity has a cardinality of zero or n 252032 meaning that for each instance of the MaintenanceOrderMessage 252002 entity there may be one or more MaintenanceOrder 252030 entities. The MaintenanceOrder 252030 entity includes various attributes, namely ID 252034 and MaintenanceOrderDescription 252040.

The ID 252034 attribute is a MaintenanceOrderID 252038 datatype. The ID 252034 attribute has a cardinality of zero or one 252036 meaning that for each instance of the MaintenanceOrder 252030 entity there may be one ID 252034 attribute.

The MaintenanceOrderDescription 252040 attribute is a SHORT_Description 252044 datatype. The MaintenanceOrderDescription 252040 attribute has a cardinality of zero or one 252042 meaning that for each instance of the MaintenanceOrder 252030 entity there may be one MaintenanceOrderDescription 252040 attribute.

The Log 252046 package is a Log 252052 datatype. The Log 252046 package includes a Log 252048 entity.

The Log 252048 entity has a cardinality of zero or one 252050 meaning that for each instance of the MaintenanceOrderMessage 252002 entity there may be one Log 252048 entity.

MaintenanceRequest Interfaces

In the event of a malfunction or exception occurring in a piece of machinery, the supervisor needs to notify the concerned maintenance staff, so that corrective measures can be taken. Maintenance Request is used to provide detailed information about the symptoms. Once the maintenance is completed, the maintenance staff can record the activities which were carried out in the maintenance request.

If a member of the maintenance staff discovers a problem during a routine inspection, he creates a maintenance request himself and after performing the maintenance tasks, document them in the maintenance request itself.

Example—if a conveyer line fails due to a malfunction in the motor in an assembly line, the concerned maintenance team needs to be notified. A maintenance request is created describing the problem. The technician then carries out corrective tasks and documents the same in the maintenance request.

Message Choreography

The message choreography of FIG. 253 describes a possible logical sequence of messages that can be used to realize a maintenance request business scenario.

A MaintenanceRequestCreateRequest_sync is a request to Enterprise Asset Management to create a maintenance request. The structure of the message type MaintenanceRequestCreateRequest_sync is specified by the message data type MaintenanceRequestCreateRequestMessage_sync.

A MaintenanceRequestCreateConfirmation_sync is a confirmation from Enterprise Asset Management for MaintenanceRequestCreateRequest_sync. The structure of the message type MaintenanceRequestCreateConfirmation_sync is specified by the message data type MaintenanceRequestCreateConfirmationMessage_sync.

MaintenanceRequestChangeCheckQuery_sync is a request to Enterprise Asset Management to check whether the operation MaintenanceRequestChangeRequest_sync is possible. The structure of the message type MaintenanceRequestChangeCheckQuery_sync is specified by the message data type MaintenanceRequestChangeCheckQueryMessage_sync.

MaintenanceRequestChangeCheckResponse_sync is a response from Enterprise Asset Management for MaintenanceRequestChangeCheckQuery_sync. The structure of the message type MaintenanceRequestChangeCheckResponse_sync is specified by the message data type MaintenanceRequestChangeCheckResponseMessage_sync.

A MaintenanceRequestChangeRequest_sync is a request to Enterprise Asset Management to change a maintenance request. The structure of the message type MaintenanceRequestChangeRequest sync is specified by the message data type MaintenanceRequestChangeRequestMessage_sync.

A MaintenanceRequestChangeConfirmation_sync is a confirmation from Enterprise Asset Management for MaintenanceRequestChangeRequest_sync. The structure of the message type MaintenanceRequestChangeConfirmation_sync is specified by the message data type MaintenanceRequestChangeConfirmationMessage_sync.

MaintenanceRequestByIDQuery_sync is an inquiry to Enterprise Asset Management for a maintenance request. The structure of the message type MaintenanceRequestByIDQuery_sync is specified by the message data type MaintenanceRequestByIDQueryMessage_sync.

MaintenanceRequestByIDResponse_sync is a response from Enterprise Asset Management to MaintenanceRequestByIDQuery_sync. The structure of the message type MaintenanceRequestByIDResponse_sync is specified by the message data type MaintenanceRequestByIDResponseMessage_sync.

MaintenanceRequestReleaseRequest_sync is a request to Enterprise Asset Management to release a maintenance request. The structure of the message type MaintenanceRequestReleaseRequest_sync is specified by the message data type MaintenanceRequestReleaseRequestMessage_sync.

MaintenanceRequestReleaseConfirmation_sync is a confirmation from Enterprise Asset Management for a MaintenanceRequestReleaseRequest_sync. The structure of the message type MaintenanceRequestReleaseConfirmation_sync is specified by the message data type MaintenanceRequestReleaseConfirmationMessage_sync.

MaintenanceRequestCloseRequest_sync is a request to Enterprise Asset Management to close a maintenance request. The structure of the message type MaintenanceRequestCloseRequest_sync is specified by the message data type MaintenanceRequestCloseRequestMessage_sync.

MaintenanceRequestCloseConfirmation_sync is a confirmation from Enterprise Asset Management for MaintenanceRequestCloseRequest_sync. The structure of the message type MaintenanceRequestCloseConfirmation_sync is specified by the message data type MaintenanceRequestCloseConfirmationMessage_sync.

MaintenanceRequestSimpleByElementsQuery_sync is a request to Enterprise Asset Management for identifying elements of maintenance requests to the selection parameters. The structure of the message type MaintenanceRequestSimpleByElementsQuery_sync is specified by the message data type MaintenanceRequestSimpleByElementsQueryMessage_sync.

MaintenanceRequestSimpleByElementsResponse_sync is a response from Enterprise Asset Management to MaintenanceRequestSimpleByElementsQuery_sync. The structure of the message type MaintenanceRequestSimpleByElementsResponse_sync is specified by the message data type MaintenanceRequestSimpleByElementsResponseMessage_sync.

MaintenanceRequestAllowedImportanceByRequestTypeQuery_sync is a request to Enterprise Asset Management to find allowed maintenance request importance for a given maintenance request type. The structure of the message type MaintenanceRequestAllowedImportanceByRequestTypeQuery_sync is specified by the message data type MaintenanceRequestAllowedImportanceByRequestTypeQueryMessage_sync.

MaintenanceRequestAllowedImportanceByRequestTypeResponse_sync is a response from Enterprise Asset Management to a MaintenanceRequestAllowedImportanceByRequestTypeQuery_sync. The structure of the message type MaintenanceRequestAllowedImportanceByRequestTypeResponse_sync is specified by the message data type MaintenanceRequestAllowedImportanceByRequestTypeResponseMessage_sync.

For example, a "Maintenance Technician" system 253002 can request to create a maintenance request using the MaintenanceRequestCreateRequest_sync message 253006 as shown, for example, in FIG. 262. An "Enterprise Asset Management" system 253004 can confirm the creation request using the MaintenanceRequestCreateConfirmation_sync message 253008 as shown, for example, in FIG. 261. The "Maintenance Technician" system 253002 can query a maintenance request change using the MaintenanceRequestChangeCheckQuery_sync message 253010 as shown, for example, in FIG. 255. The "Enterprise Asset Management" system 253004 can respond to the query using the MaintenanceRequestChangeCheckResponse_sync message 253012 as shown, for example, in FIG. 256. The "Maintenance Technician" system 253002 can request to change a maintenance request using the MaintenanceRequestChangeRequest_sync message 253014 as shown, for example, in FIG. 258. The "Enterprise Asset Management" system 253004 can confirm the change request using the MaintenanceRequestChangeConfirmation_sync message 253016 as shown, for example, in FIG. 257. The "Maintenance Technician" system 253002 can query a maintenance request by ID using the MaintenanceRequestByIDQuery_sync message 253018 as shown, for example, in FIG. 254. The "Enterprise Asset Management" system 253004 can respond to the query using the MaintenanceRequestByIDResponse_sync message 253020. The "Maintenance Technician" system 253002 can request to release a maintenance request using the MaintenanceRequestReleaseRequest_sync message 253022 as shown, for example, in FIG. 266. The "Enterprise Asset Management" system 253004 can confirm the release request using the MaintenanceRequestReleaseConfirmation_sync message 253024 as shown, for example, in FIG. 265. The "Maintenance Technician" system 253002 can request to close a maintenance request using the MaintenanceRequestCloseRequest_sync message 253026 as shown, for example, in FIG. 260. The "Enterprise Asset Management" system 253004 can confirm the close request using the MaintenanceRequestCloseConfirmation_sync message 253028 as shown, for example, in FIG. 259. The "Maintenance Technician" system 253002 can query a maintenance request by individual material and installation point using the MaintenanceRequestSimpleByIndividualMaterialAndInstallationPointQuery_sync message 253030 as shown, for example, in FIG. 267. The "Enterprise Asset Management" system 253004 can respond to the query using the MaintenanceRequestSimpleByIndividualMaterialAndInstallationPointResponse_sync message 253032 as shown, for example, in FIG. 268. The "Maintenance Technician" system 253002 can query a maintenance request by allowed importance by request type using the MaintenanceRequestAllowedImportanceByRequestTypeQuery_sync message 253034 as shown, for example, in FIG. 263. The "Enterprise Asset Management" system 253004 can respond to the query using the MaintenanceRequestAllowedImportanceByRequestTypeResponse_sync message 253036 as shown, for example, in FIG. 264.

Message Data Type

The message data type MaintenanceRequestCreateRequestMessage_sync contains the business information that is relevant for sending a business document in a message and the Maintenance Request included in the business document. FIGS. 288-1 through 288-17 show a MaintenanceRequestCreateRequestMessage_sync 28800 package. The MaintenanceRequestCreateRequestMessage_sync 28800 package is a MaintenanceRequestCreateRequestMessage_sync 28804 datatype. The MaintenanceRequestCreateRequestMessage_sync 28800 package includes a MaintenanceRequestCreateRequestMessage_sync 28802 entity. The MaintenanceRequestCreateRequestMessage_sync 28800 package includes various packages, namely MessageHeader 28806 and MaintenanceRequest 28814.

The MessageHeader 28806 package is a BasicBusinessDocumentMessageHeader 28812 datatype. The MessageHeader 28806 package includes a MessageHeader 28808 entity.

The MessageHeader 28808 entity has a cardinality of zero or one 28810 meaning that for each instance of the MaintenanceRequestCreateRequestMessage_sync 28802 entity there may be one MessageHeader 28808 entity.

The MaintenanceRequest 28814 package includes a MaintenanceRequest 28816 entity. The MaintenanceRequest 28814 package includes various packages, namely Item 288176, Task 288398 and Activity 288462.

The MaintenanceRequest 28816 entity has a cardinality of one 28818 meaning that for each instance of the MaintenanceRequestCreateRequestMessage_sync 28802 entity there is one MaintenanceRequest 28816 entity. The MaintenanceRequest 28816 entity includes various attributes, namely ProjectWorkBreakdownStructureElementID 28820, IssueMaintenanceIssueCategoryCatalogueID 28826, IssueParentMaintenanceIssueCategoryID 28832, IssueMaintenanceIssueCategoryID 28838, MaterialInternalID 28844, InstallationPointID 28850, IndividualMaterialID 28856, SerialID 28862, MaintenancePlantID 28868, MaintenancePlanningPlantID 28874, MaintenanceWorkCentreID 28880, MaintenanceWorkCentrePlantID 28886, ReporterInternalID 28892, LocationInternalID 28898, AffectedInstallationPointID 288104, AffectedIndividualMaterialID 288110, ReportedDateTime 288116, TypeCode 288122, ImportanceCode 288128, ProductionPlannerGroupCode 288134, RequestedProcessingPeriod 288140, MachineryBreakdownIndicator 288146, MachineryMalfunctionPeriod 288152, MachineryBreakdownDuration 288158, Description 288164 and DetailedText 288170.

The ProjectWorkBreakdownStructureElementID 28820 attribute is a ProjectWorkBreakdownStructureElementED 28824 datatype. The ProjectWorkBreakdownStructureElementID 28820 attribute has a cardinality of zero or one 28822 meaning that for each instance of the MaintenanceRequest 28816 entity there may be one ProjectWorkBreakdownStructureElementID 28820 attribute.

The IssueMaintenanceIssueCategoryCatalogueID 28826 attribute is a MaintenanceIssueCategoryCatalogueID 28830 datatype. The IssueMaintenanceIssueCategoryCatalogueID 28826 attribute has a cardinality of zero or one 28828 meaning that for each instance of the MaintenanceRequest 28816 entity there may be one IssueMaintenanceIssueCategoryCatalogueID 28826 attribute.

The IssueParentMaintenanceIssueCategoryID 28832 attribute is a MaintenanceIssueCategoryID 28836 datatype. The IssueParentMaintenanceIssueCategoryID 28832 attribute has a cardinality of zero or one 28834 meaning that for each instance of the MaintenanceRequest 28816 entity there may be one IssueParentMaintenanceIssueCategoryID 28832 attribute.

The IssueMaintenanceIssueCategoryID 28838 attribute is a MaintenanceIssueCategoryID 28842 datatype. The IssueMaintenanceIssueCategoryID 28838 attribute has a cardinality of zero or one 28840 meaning that for each instance of the MaintenanceRequest 28816 entity there may be one IssueMaintenanceIssueCategoryID 28838 attribute.

The MaterialInternalID 28844 attribute is a ProductInternalID 28848 datatype. The MaterialInternalID 28844 attribute has a cardinality of zero or one 28846 meaning that for each instance of the MaintenanceRequest 28816 entity there may be one MaterialInternalID 28844 attribute.

The InstallationPointID 28850 attribute is an InstallationPointID 28854 datatype. The InstallationPointID 28850 attribute has a cardinality of zero or one 28852 meaning that for each instance of the MaintenanceRequest 28816 entity there may be one InstallationPointID 28850 attribute.

The IndividualMaterialID 28856 attribute is a ProductInternalID 28860 datatype. The IndividualMaterialID 28856 attribute has a cardinality of zero or one 28858 meaning that for each instance of the MaintenanceRequest 28816 entity there may be one IndividualMaterialID 28856 attribute.

The SerialID 28862 attribute is a SerialID 28866 datatype. The SerialID 28862 attribute has a cardinality of zero or one 28864 meaning that for each instance of the MaintenanceRequest 28816 entity there may be one SerialID 28862 attribute.

The MaintenancePlantID 28868 attribute is a PlantID 28872 datatype. The MaintenancePlantID 28868 attribute has a cardinality of zero or one 28870 meaning that for each instance of the MaintenanceRequest 28816 entity there may be one MaintenancePlantID 28868 attribute.

The MaintenancePlanningPlantID 28874 attribute is a PlantID 28878 datatype. The MaintenancePlanningPlantID 28874 attribute has a cardinality of zero or one 28876 meaning that for each instance of the MaintenanceRequest 28816 entity there may be one MaintenancePlanningPlantID 28874 attribute.

The MaintenanceWorkCentreID 28880 attribute is a WorkCentreID 28884 datatype. The MaintenanceWorkCentreID 28880 attribute has a cardinality of zero or one 28882 meaning that for each instance of the MaintenanceRequest 28816 entity there may be one MaintenanceWorkCentreID 28880 attribute.

The MaintenanceWorkCentrePlantID 28886 attribute is a PlantID 28890 datatype. The MaintenanceWorkCentrePlantID 28886 attribute has a cardinality of zero or one 28888 meaning that for each instance of the MaintenanceRequest 28816 entity there may be one MaintenanceWorkCentrePlantID 28886 attribute.

The ReporterInternalID 28892 attribute is a PartyInternalID 28896 datatype. The ReporterInternalID 28892 attribute has a cardinality of zero or one 28894 meaning that for each instance of the MaintenanceRequest 28816 entity there may be one ReporterInternalID 28892 attribute.

The LocationInternalID 28898 attribute is a LocationInternalID 288102 datatype. The LocationInternalID 28898 attribute has a cardinality of zero or one 288100 meaning that for each instance of the MaintenanceRequest 28816 entity there may be one LocationInternalID 28898 attribute.

The AffectedInstallationPointID 288104 attribute is an InstallationPointID 288108 datatype. The AffectedInstallationPointID 288104 attribute has a cardinality of zero or one 288106 meaning that for each instance of the MaintenanceRequest 28816 entity there may be one AffectedInstallationPointID 288104 attribute.

The AffectedIndividualMaterialID 288110 attribute is a ProductInternalID 288114 datatype. The AffectedIndividualMaterialID 288110 attribute has a cardinality of zero or one 288112 meaning that for each instance of the MaintenanceRequest 28816 entity there may be one AffectedIndividualMaterialID 288110 attribute.

The ReportedDateTime 288116 attribute is a TIMEZONEINDEPENDENT_DateTime 288120 datatype. The ReportedDateTime 288116 attribute has a cardinality of zero or one 288118 meaning that for each instance of the MaintenanceRequest 28816 entity there may be one ReportedDateTime 288116 attribute.

The TypeCode 288122 attribute is a MaintenanceRequestTypeCode 288126 datatype. The TypeCode 288122 attribute has a cardinality of one 288124 meaning that for each instance of the MaintenanceRequest 28816 entity there is one TypeCode 288122 attribute.

The ImportanceCode 288128 attribute is an ImportanceCode 288132 datatype. The ImportanceCode 288128 attribute has a cardinality of zero or one 288130 meaning that for each instance of the MaintenanceRequest 28816 entity there may be one ImportanceCode 288128 attribute.

The ProductionPlannerGroupCode 288134 attribute is a ProductionPlannerGroupCode 288138 datatype. The ProductionPlannerGroupCode 288134 attribute has a cardinality of zero or one 288136 meaning that for each instance of the MaintenanceRequest 28816 entity there may be one ProductionPlannerGroupCode 288134 attribute.

The RequestedProcessingPeriod 288140 attribute is an UPPEROPEN_TIMEZONEINDEPENDENT_ DateTimePeriod 288144 datatype. The RequestedProcessingPeriod 288140 attribute has a cardinality of zero or one 288142 meaning that for each instance of the MaintenanceRequest 28816 entity there may be one RequestedProcessingPeriod 288140 attribute.

The MachineryBreakdownIndicator 288146 attribute is an Indicator 288150 datatype. The MachineryBreakdownIndicator 288146 attribute has a cardinality of zero or one 288148 meaning that for each instance of the MaintenanceRequest 28816 entity there may be one MachineryBreakdownIndicator 288146 attribute.

The MachineryMalfunctionPeriod 288152 attribute is an UPPEROPEN_TIMEZONEINDEPENDENT_ DateTimePeriod 288156 datatype. The MachineryMalfunctionPeriod 288152 attribute has a cardinality of zero or one 288154 meaning that for each instance of the MaintenanceRequest 28816 entity there may be one MachineryMalfunctionPeriod 288152 attribute.

The MachineryBreakdownDuration 288158 attribute is a Duration 288162 datatype. The MachineryBreakdownDuration 288158 attribute has a cardinality of zero or one 288160 meaning that for each instance of the MaintenanceRequest 28816 entity there may be one MachineryBreakdownDuration 288158 attribute.

The Description 288164 attribute is a SHORT Description 288168 datatype. The Description 288164 attribute has a cardinality of zero or one 288166 meaning that for each instance of the MaintenanceRequest 28816 entity there may be one Description 288164 attribute.

The DetailedText 288170 attribute is a Text 288174 datatype. The DetailedText 288170 attribute has a cardinality of zero or one 288172 meaning that for each instance of the MaintenanceRequest 28816 entity there may be one DetailedText 288170 attribute.

The Item 288176 package includes an Item 288178 entity. The Item 288176 package includes various packages, namely Cause 288242, Task 288284 and Activity 288350.

The Item 288178 entity has a cardinality of zero or n 288180 meaning that for each instance of the MaintenanceRequest 28816 entity there may be one or more Item 288178 entities. The Item 288178 entity includes various attributes, namely MaterialInternalID 288182, DamageMaintenanceIssueCategoryCatalogueID 288188, DamageParentMaintenanceIssueCategoryID 288194, DamageMaintenanceIssueCategoryID 288200, ObjectPartMaintenanceIssueCategoryCatalogueID 288206, ObjectPartParentMaintenanceIssueCategoryID 288212, ObjectPartMaintenanceIssueCategoryID 288218, Description 288224, DetailedText 288230 and OrdinalNumberValue 288236.

The MaterialInternalID 288182 attribute is a ProductInternalID 288186 datatype. The MaterialInternalID 288182 attribute has a cardinality of zero or one 288184 meaning that for each instance of the Item 288178 entity there may be one MaterialInternalID 288182 attribute.

The DamageMaintenanceIssueCategoryCatalogueID 288188 attribute is a MaintenanceIssueCategoryCatalogueID 288192 datatype. The DamageMaintenanceIssueCategoryCatalogueID 288188 attribute has a cardinality of zero or one 288190 meaning that for each instance of the Item 288178 entity there may be one DamageMaintenanceIssueCategoryCatalogueID 288188 attribute.

The DamageParentMaintenanceIssueCategoryID 288194 attribute is a MaintenanceIssueCategoryID 288198 datatype. The DamageParentMaintenanceIssueCategoryID 288194 attribute has a cardinality of zero or one 288196 meaning that for each instance of the Item 288178 entity there may be one DamageParentMaintenanceIssueCategoryID 288194 attribute.

The DamageMaintenanceIssueCategoryID 288200 attribute is a MaintenanceIssueCategoryID 288204 datatype. The DamageMaintenanceIssueCategoryID 288200 attribute has a cardinality of zero or one 288202 meaning that for each instance of the Item 288178 entity there may be one DamageMaintenanceIssueCategoryID 288200 attribute.

The ObjectPartMaintenanceIssueCategoryCatalogueID 288206 attribute is a MaintenanceIssueCategoryCatalogueID 288210 datatype. The ObjectPartMaintenanceIssueCategoryCatalogueID 288206 attribute has a cardinality of zero or one 288208 meaning that for each instance of the Item 288178 entity there may be one ObjectPartMaintenanceIssueCategoryCatalogueID 288206 attribute.

The ObjectPartParentMaintenanceIssueCategoryID 288212 attribute is a MaintenanceIssueCategoryID 288216 datatype. The ObjectPartParentMaintenanceIssueCategoryID 288212 attribute has a cardinality of zero or one 288214 meaning that for each instance of the Item 288178 entity there may be one ObjectPartParentMaintenanceIssueCategoryID 288212 attribute.

The ObjectPartMaintenanceIssueCategoryID 288218 attribute is a MaintenanceIssueCategoryID 288222 datatype. The ObjectPartMaintenanceIssueCategoryID 288218 attribute has a cardinality of zero or one 288220 meaning that for each instance of the Item 288178 entity there may be one ObjectPartMaintenanceIssueCategoryID 288218 attribute.

The Description 288224 attribute is a SHORT_Description 288228 datatype. The Description 288224 attribute has a cardinality of zero or one 288226 meaning that for each instance of the Item 288178 entity there may be one Description 288224 attribute.

The DetailedText 288230 attribute is a Text 288234 datatype. The DetailedText 288230 attribute has a cardinality of zero or one 288232 meaning that for each instance of the Item 288178 entity there may be one DetailedText 288230 attribute.

The OrdinalNumberValue 288236 attribute is an OrdinalNumberValue 288240 datatype. The OrdinalNumberValue 288236 attribute has a cardinality of one 288238 meaning that for each instance of the Item 288178 entity there is one OrdinalNumberValue 288236 attribute.

The Cause 288242 package includes a Cause 288244 entity.

The Cause 288244 entity has a cardinality of zero or n 288246 meaning that for each instance of the Item 288178 entity there may be one or more Cause 288244 entities. The Cause 288244 entity includes various attributes, namely CauseMaintenanceIssueCategoryCatalogueID 288248, CauseParentMaintenanceIssueCategoryID 288254, CauseMaintenanceIssueCategoryID 288260, Description 288266, DetailedText 288272 and OrdinalNumberValue 288278.

The CauseMaintenanceIssueCategoryCatalogueID 288248 attribute is a MaintenanceIssueCategoryCatalogueID 288252 datatype. The CauseMaintenanceIssueCategoryCatalogueID 288248 attribute has a cardinality of zero or one 288250 meaning that for each instance of the Cause 288244 entity there may be one CauseMaintenanceIssueCategoryCatalogueID 288248 attribute.

The CauseParentMaintenanceIssueCategoryID 288254 attribute is a MaintenanceIssueCategoryID 288258 datatype. The CauseParentMaintenanceIssueCategoryID 288254 attribute has a cardinality of zero or one 288256 meaning that for each instance of the Cause 288244 entity there may be one CauseParentMaintenanceIssueCategoryID 288254 attribute.

The CauseMaintenanceIssueCategoryID 288260 attribute is a MaintenanceIssueCategoryID 288264 datatype. The CauseMaintenanceIssueCategoryID 288260 attribute has a cardinality of zero or one 288262 meaning that for each instance of the Cause 288244 entity there may be one CauseMaintenanceIssueCategoryID 288260 attribute.

The Description 288266 attribute is a SHORT_Description 288270 datatype. The Description 288266 attribute has a cardinality of zero or one 288268 meaning that for each instance of the Cause 288244 entity there may be one Description 288266 attribute.

The DetailedText 288272 attribute is a Text 288276 datatype. The DetailedText 288272 attribute has a cardinality of zero or one 288274 meaning that for each instance of the Cause 288244 entity there may be one DetailedText 288272 attribute.

The OrdinalNumberValue 288278 attribute is an OrdinalNumberValue 288282 datatype. The OrdinalNumberValue 288278 attribute has a cardinality of one 288280 meaning that for each instance of the Cause 288244 entity there is one OrdinalNumberValue 288278 attribute.

The Task 288284 package includes a Task 288286 entity.

The Task 288286 entity has a cardinality of zero or n 288288 meaning that for each instance of the Item 288178 entity there may be one or more Task 288286 entities. The Task 288286 entity includes various attributes, namely EmployeeResponsibleInternalID 288290, CompleterInternalID 288296, TaskMaintenanceIssueCategoryCatalogueID 288302, TaskParentMaintenanceIssueCategoryID 288308, TaskMaintenanceIssueCategoryID 288314, EmployeeResponsibleInternalTypeCode 288320, PlannedProcessingPeriod 288326, Description 288332, DetailedText 288338 and OrdinalNumberValue 288344.

The EmployeeResponsibleInternalID 288290 attribute is a PartyInternalID 288294 datatype. The EmployeeResponsibleInternalID 288290 attribute has a cardinality of zero or one 288292 meaning that for each instance of the Task 288286 entity there may be one EmployeeResponsibleInternalID 288290 attribute.

The CompleterInternalID 288296 attribute is a PartyInternalID 288300 datatype. The CompleterInternalID 288296 attribute has a cardinality of zero or one 288298 meaning that for each instance of the Task 288286 entity there may be one CompleterInternalID 288296 attribute.

The TaskMaintenanceIssueCategoryCatalogueID 288302 attribute is a MaintenanceIssueCategoryCatalogueID 288306 datatype. The TaskMaintenanceIssueCategoryCatalogueID 288302 attribute has a cardinality of zero or one 288304 meaning that for each instance of the Task 288286 entity there may be one TaskMaintenanceIssueCategoryCatalogueID 288302 attribute.

The TaskParentMaintenanceIssueCategoryID 288308 attribute is a MaintenanceIssueCategoryID 288312 datatype. The TaskParentMaintenanceIssueCategoryID 288308 attribute has a cardinality of zero or one 288310 meaning that for each instance of the Task 288286 entity there may be one TaskParentMaintenanceIssueCategoryID 288308 attribute.

The TaskMaintenanceIssueCategoryID 288314 attribute is a MaintenanceIssueCategoryID 288318 datatype. The TaskMaintenanceIssueCategoryID 288314 attribute has a cardinality of zero or one 288316 meaning that for each instance of the Task 288286 entity there may be one TaskMaintenanceIssueCategoryID 288314 attribute.

The EmployeeResponsibleInternalTypeCode 288320 attribute is a BusinessObjectTypeCode 288324 datatype. The EmployeeResponsibleInternalTypeCode 288320 attribute has a cardinality of zero or one 288322 meaning that for each instance of the Task 288286 entity there may be one EmployeeResponsibleInternalTypeCode 288320 attribute.

The PlannedProcessingPeriod 288326 attribute is an UPPEROPEN_TIMEZONEINDEPENDENT_ DateTimePeriod 288330 datatype. The PlannedProcessingPeriod 288326 attribute has a cardinality of zero or one 288328 meaning that for each instance of the Task 288286 entity there may be one PlannedProcessingPeriod 288326 attribute.

The Description 288332 attribute is a SHORT_Description 288336 datatype. The Description 288332 attribute has a cardinality of zero or one 288334 meaning that for each instance of the Task 288286 entity there may be one Description 288332 attribute.

The DetailedText 288338 attribute is a Text 288342 datatype. The DetailedText 288338 attribute has a cardinality of zero or one 288340 meaning that for each instance of the Task 288286 entity there may be one DetailedText 288338 attribute.

The OrdinalNumberValue 288344 attribute is an OrdinalNumberValue 288348 datatype. The OrdinalNumberValue 288344 attribute has a cardinality of one 288346 meaning that for each instance of the Task 288286 entity there is one OrdinalNumberValue 288344 attribute.

The Activity 288350 package includes an Activity 288352 entity.

The Activity 288352 entity has a cardinality of zero or n 288354 meaning that for each instance of the Item 288178 entity there may be one or more Activity 288352 entities. The Activity 288352 entity includes various attributes, namely ActivityMaintenanceIssueCategoryCatalogueID 288356, ActivityParentMaintenanceIssueCategoryID 288362, ActivityMaintenanceIssueCategoryID 288368, ProcessingPeriod 288374, Description 288380, DetailedText 288386 and OrdinalNumberValue 288392.

The ActivityMaintenanceIssueCategoryCatalogueID 288356 attribute is a MaintenanceIssueCategoryCatalogueID 288360 datatype. The ActivityMaintenanceIssueCategoryCatalogueID 288356 attribute has a cardinality of zero or one 288358 meaning that for each instance of the Activity 288352 entity there may be one ActivityMaintenanceIssueCategoryCatalogueID 288356 attribute.

The ActivityParentMaintenanceIssueCategoryID 288362 attribute is a MaintenanceIssueCategoryID 288366 datatype. The ActivityParentMaintenanceIssueCategoryID 288362 attribute has a cardinality of zero or one 288364 meaning that for each instance of the Activity 288352 entity there may be one ActivityParentMaintenanceIssueCategoryID 288362 attribute.

The ActivityMaintenanceIssueCategoryID 288368 attribute is a MaintenanceIssueCategoryID 288372 datatype. The ActivityMaintenanceIssueCategoryID 288368 attribute has a cardinality of zero or one 288370 meaning that for each instance of the Activity 288352 entity there may be one ActivityMaintenanceIssueCategoryID 288368 attribute.

The ProcessingPeriod 288374 attribute is an UPPEROPEN_TIMEZONEINDEPENDENT_DateTimePeriod 288378 datatype. The ProcessingPeriod 288374 attribute has a cardinality of zero or one 288376 meaning that for each instance of the Activity 288352 entity there may be one ProcessingPeriod 288374 attribute.

The Description 288380 attribute is a SHORT_Description 288384 datatype. The Description 288380 attribute has a cardinality of zero or one 288382 meaning that for each instance of the Activity 288352 entity there may be one Description 288380 attribute.

The DetailedText 288386 attribute is a Text 288390 datatype. The DetailedText 288386 attribute has a cardinality of zero or one 288388 meaning that for each instance of the Activity 288352 entity there may be one DetailedText 288386 attribute.

The OrdinalNumberValue 288392 attribute is an OrdinalNumberValue 288396 datatype. The OrdinalNumberValue 288392 attribute has a cardinality of one 288394 meaning that for each instance of the Activity 288352 entity there is one OrdinalNumberValue 288392 attribute.

The Task 288398 package includes a Task 288400 entity.

The Task 288400 entity has a cardinality of zero or n 288402 meaning that for each instance of the MaintenanceRequest 28816 entity there may be one or more Task 288400 entities. The Task 288400 entity includes various attributes, namely EmployeeResponsibleInternalID 288404, CompleterInternalID 288410, TaskMaintenanceIssueCategoryCatalogueID 288416, TaskParentMaintenanceIssueCategoryID 288422 and TaskMaintenanceIssueCategoryID 288428. The Task 288400 entity has various subordinate entities, namely EmployeeResponsibleInternalTypeCode 288434, PlannedProcessingPeriod 288438, Description 288444, DetailedText 288450 and OrdinalNumberValue 288456.

The EmployeeResponsibleInternalID 288404 attribute is a PartyInternalID 288408 datatype. The EmployeeResponsibleInternalID 288404 attribute has a cardinality of zero or one 288406 meaning that for each instance of the Task 288400 entity there may be one EmployeeResponsibleInternalID 288404 attribute.

The CompleterInternalID 288410 attribute is a PartyInternalID 288414 datatype. The CompleterInternalID 288410 attribute has a cardinality of zero or one 288412 meaning that for each instance of the Task 288400 entity there may be one CompleterInternalID 288410 attribute.

The TaskMaintenanceIssueCategoryCatalogueID 288416 attribute is a MaintenanceIssueCategoryCatalogueID 288420 datatype. The TaskMaintenanceIssueCategoryCatalogueID 288416 attribute has a cardinality of zero or one 288418 meaning that for each instance of the Task 288400 entity there may be one TaskMaintenanceIssueCategoryCatalogueID 288416 attribute.

The TaskParentMaintenanceIssueCategoryID 288422 attribute is a MaintenanceIssueCategoryID 288426 datatype. The TaskParentMaintenanceIssueCategoryID 288422 attribute has a cardinality of zero or one 288424 meaning that for each instance of the Task 288400 entity there may be one TaskParentMaintenanceIssueCategoryID 288422 attribute.

The TaskMaintenanceIssueCategoryID 288428 attribute is a MaintenanceIssueCategoryID 288432 datatype. The TaskMaintenanceIssueCategoryID 288428 attribute has a cardinality of zero or one 288430 meaning that for each instance of the Task 288400 entity there may be one TaskMaintenanceIssueCategoryID 288428 attribute.

The EmployeeResponsibleInternalTypeCode 288434 entity has a cardinality of zero or one 288436 meaning that for each instance of the Task 288400 entity there may be one EmployeeResponsibleInternalTypeCode 288434 entity.

The PlannedProcessingPeriod 288438 entity has a cardinality of zero or one 288440 meaning that for each instance of the Task 288400 entity there may be one PlannedProcessingPeriod 288438 entity.

The Description 288444 entity has a cardinality of zero or one 288446 meaning that for each instance of the Task 288400 entity there may be one Description 288444 entity.

The DetailedText 288450 entity has a cardinality of zero or one 288452 meaning that for each instance of the Task 288400 entity there may be one DetailedText 288450 entity.

The OrdinalNumberValue 288456 entity has a cardinality of one 288458 meaning that for each instance of the Task 288400 entity there is one OrdinalNumberValue 288456 entity.

The Activity 288462 package includes an Activity 288464 entity.

The Activity 288464 entity has a cardinality of zero or n 288466 meaning that for each instance of the MaintenanceRequest 28816 entity there may be one or more Activity 288464 entities. The Activity 288464 entity includes various attributes, namely ActivityMaintenanceIssueCategoryCatalogueID 288468, ActivityParentMaintenanceIssueCategoryID 288474, ActivityMaintenanceIssueCategoryID 288480, ProcessingPeriod 288486, Description 288492, DetailedText 288498 and OrdinalNumberValue 288504.

The ActivityMaintenanceIssueCategoryCatalogueID 288468 attribute is a MaintenanceIssueCategoryCatalogueID 288472 datatype. The ActivityMaintenanceIssueCategoryCatalogueID 288468 attribute has a cardinality of zero or one 288470 meaning that for each instance of the Activity 288464 entity there may be one ActivityMaintenanceIssueCategoryCatalogueID 288468 attribute.

The ActivityParentMaintenanceIssueCategoryID 288474 attribute is a MaintenanceIssueCategoryID 288478 datatype. The ActivityParentMaintenanceIssueCategoryID 288474 attribute has a cardinality of zero or one 288476 meaning that for each instance of the Activity 288464 entity there may be one ActivityParentMaintenanceIssueCategoryID 288474 attribute.

The ActivityMaintenanceIssueCategoryID 288480 attribute is a MaintenanceIssueCategoryID 288484 datatype. The ActivityMaintenanceIssueCategoryID 288480 attribute has a cardinality of zero or one 288482 meaning that for each instance of the Activity 288464 entity there may be one ActivityMaintenanceIssueCategoryID 288480 attribute.

The ProcessingPeriod 288486 attribute is an UPPEROPEN_TIMEZONEINDEPENDENT_DateTimePeriod 288490 datatype. The ProcessingPeriod 288486 attribute has a cardinality of zero or one 288488 meaning that for each instance of the Activity 288464 entity there may be one ProcessingPeriod 288486 attribute.

The Description 288492 attribute is a SHORT_Description 288496 datatype. The Description 288492 attribute has a cardinality of zero or one 288494 meaning that for each instance of the Activity 288464 entity there may be one Description 288492 attribute.

The DetailedText 288498 attribute is a Text 288502 datatype. The DetailedText 288498 attribute has a cardinality of zero or one 288500 meaning that for each instance of the Activity 288464 entity there may be one DetailedText 288498 attribute.

The OrdinalNumberValue 288504 attribute is an OrdinalNumberValue 288508 datatype. The OrdinalNumberValue 288504 attribute has a cardinality of one 288506 meaning that for each instance of the Activity 288464 entity there is one OrdinalNumberValue 288504 attribute.

MessageHeader Package

A MessageHeader package groups the business information that is relevant for sending a business document in a message.

MessageHeader

A MessageHeader groups business information from the perspective of the sending application. For example, information to identify the business document in a message.

MaintenanceRequest Package

The MaintenanceRequest package groups the MaintenanceRequest with its entities.

MaintenanceRequest

A MaintenanceRequest is a request for maintenance of a product or an installation point. Maintenance requests document maintenance tasks completely, and make them available for analysis in the long term. It also helps in preliminary planning and execution of tasks.

ProjectWorkBreakdownStructureElementID (may be optional) refers to an identifier for a Project Work Breakdown Structure Element. A Project Work Breakdown Structure (WBS) organizes the different tasks involved in the project in a hierarchical structure. The WBS consists of a number of WBS elements. A WBS element represents a certain task or a partial task that can be subdivided further. IssueMaintenanceIssueCategoryCatalogueID (may be optional) refers to an identifier for a catalogue of categories for maintenance-related issues of type Issue. IssueParentMaintenanceIssueCategoryID (may be optional) is directly superordinate to a particular category, it is an identifier for a category of a maintenance-related issue of type Issue. IssueMaintenanceIssueCategoryID (may be optional) refers to an identifier for a category of a maintenance-related issue of type Subject. MaterialInternalID (may be optional) refers to a proprietary identifier for a material. This is the identifier of a material for which maintenance request is being created. InstallationPointID (may be optional) refers to a unique identifier for an installation point. It is the identifier of an installation point for which maintenance request is being created. IndividualMaterialID (may be optional) refers to a proprietary identifier for an individual material. It is the identifier of an individual material for which maintenance request is being created. SerialID (may be optional) refers to a unique identifier for an individual material that is assigned in the maintenance request. MaintenancePlantID (may be optional) refers to an identifier of a plant in which the product and installation point of a company are installed and maintained. MaintenancePlanningPlantID (may be optional) refers to an identifier of a plant in which the planning and the supervision of the execution of maintenance work is done. MaintenanceWorkCentreID (may be optional) refers to an identifier of a WorkCentre where the execution of maintenance work is done. MaintenanceWorkCentrePlantID (may be optional) refers to an identifier of a Plant where the work centre which is responsible for the execution of maintenance work is present. ReporterInternalID (may be optional) refers to a proprietary identifier for a party which reports a maintenance request. LocationInternalID (may be optional) refers to a proprietary identifier for a location of the product or installation point that has to be maintained within a maintenance plant. AffectedInstallationPointID (may be optional) refers to a unique identifier of an installation point which has a side effect by the maintenance request. AffectedIndividualMaterialID (may be optional) refers to a proprietary identifier of an individual material which has a side effect by the maintenance request. TypeCode refers to a coded representation of the type of a maintenance request. ImportanceCode (may be optional) refers to the coded representation of the importance of maintenance request. ProductionPlannerGroupCode (may be optional) refers to the coded representation of a MaintenancePlannerGroup. RequestedProcessingPeriod (may be optional) refers to a Period is a period during which processing of the maintenance request is requested. MachineryBreakdownIndicator (may be optional) refers to the representation of machinery in the state of breakdown. It indicates whether the machinery is in the state of breakdown or not. MachineryMalfunctionPeriod (may be optional) refers to a Period is a period during which machinery has or had malfunctions. MachineryBreakdownDuration (may be optional) refers to a period of time of a particular length without a fixed start or end time, during which a machinery is in the state breakdown. MachineryBreakdownDuration can be entered when the MachineryBreakdownIndicator is set to true. Description (may be optional) refers to a representation of the properties of a maintenance request in natural language. DetailedText (may be optional) refers to a language-dependent specification for a maintenance request. A MaintenanceIssueCategoryID can be unique in combination with a ParentMaintenanceIssueCategoryID and MaintenanceIssueCategoryCatalogueID.

Item Package

An Item package groups together all the relevant information in terms of an item.

Item

An item is an individual problem or exceptional situation that has occurred with a product or an installation point. MaterialInternalID (may be optional) refers to a proprietary identifier for a material in a maintenance request item. DamageMaintenanceIssueCategoryCatalogueID (may be optional) refers to an identifier for a catalogue of categories for maintenance-related issues of type Damage. DamageParentMaintenanceIssueCategoryID (may be optional) may be directly superordinate to a particular category, it is an identifier for a category of a maintenance-related issue of type Subject. DamageMaintenanceIssueCategoryID (may be optional) refers to an identifier for a category of a maintenance-related issue of type Damage. ObjectPartMaintenanceIssueCategoryCatalogueID (may be optional) refers to an identifier for a catalogue of categories for maintenance-related issues of type ObjectPart. ObjectPartParentMaintenanceIssueCategoryID (may be optional) may be directly superordinate to a particular category, it is an identifier for a category of a maintenance-related issue of type ObjectPart. ObjectPartMaintenanceIssueCategoryID (may be optional) refers to an identifier for a category of a maintenance-related issue of type ObjectPart. Description (may be optional) refers to a representation of the properties of a maintenance request item in natural language. DetailedText (may be optional) refers to a language-dependent specification for a maintenance request item. OrdinalNumberValue refers to a number that indicates the position of a maintenance request item in a linearly ordered set that is ordered according to particular factors. A MaintenanceIssueCategoryID can be unique in combination with a ParentMaintenanceIssueCategoryID and MaintenanceIssueCategoryCatalogueID. A maintenance request refers to an item but it is possible to create a maintenance request without one. It is possible to attach more than one task, activity and cause per item.

Cause

A Cause is a cause that led to the occurrence of the malfunction or exceptional situation in a product or an installation point. CauseMaintenanceIssueCategoryCatalogueID (may be optional) refers to an identifier for a catalogue of categories for maintenance-related issues of type Cause. CauseParentMaintenanceIssueCategoryID (may be optional) may be directly superordinate to a particular category, it is an identifier for a category of a maintenance-related issue of type Cause. CauseMaintenanceIssueCategoryID (may be optional) refers to an identifier for a category of a maintenance-related issue of type Cause. Description (may be optional) refers to a representation of the properties of a maintenance request item cause in natural language. DetailedText (may be optional) refers to a language-dependent specification for a maintenance request item cause. OrdinalNumberValue refers to a number that indicates the position of an maintenance request item cause in a linearly ordered set that is ordered according to particular factors. A MaintenanceIssueCategoryID can be unique in combination with a ParentMaintenanceIssueCategoryID and MaintenanceIssueCategoryCatalogueID.

Task

A Task is a long-term action required to rectify the malfunction or exceptional situation in a product or an installation point. EmployeeResponsibleInternalID (may be optional) refers to a proprietary identifier for a EmployeeResponsible who is responsible for processing a task. CompletorInternalID (may be optional) refers to an identifier of the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as the key for the task to be performed and a brief instruction describing what is to be done, the planned start and end dates for the task, and the task status.

Activity

An Activity is a short-term action that shall be executed immediately to rectify the malfunction or exceptional situation in a product or an installation point. ActivityMaintenanceIssueCategoryCatalogueID (may be optional) refers to a maintenance issue category catalogue of type Activity. ActivityParentMaintenanceIssueCategoryID (may be optional) refers to a parent category of type Activity. ActivityMaintenanceIssueCategoryID (may be optional) refers to a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue refers to an identifier of the position of an activity in a sorted list. A MaintenanceIssueCategoryID can be unique in combination with a ParentMaintenanceIssueCategoryID and MaintenanceIssueCategoryCatalogueID.

Task Package

A Task package groups together all the relevant information in terms of a task.

Task

A Task is a long-term action required to rectify the malfunction or exceptional situation in a product or an installation point. EmployeeResponsibleInternalID (may be optional) refers to a proprietary identifier for a EmployeeResponsible who is responsible for processing a task. CompletorInternalID (may be optional) refers to an identifier of the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to detailed text for a task. OrdinalNumberValue refers to a number that indicates the position of a maintenance request task in a linearly ordered set that is ordered according to particular factors. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as the key for the task to be performed and a brief instruction describing what is to be done, the planned start and end dates for the task, and the task status.

Activity Package

An Activity package groups together all the relevant information in terms of a activity.

Activity

An Activity is a short-term action that shall be executed immediately to rectify the malfunction or exceptional situation in a product or an installation point. ActivityMaintenanceIssueCategoryCatalogueID (may be optional) refers to a maintenance issue category catalogue of type Activity. ActivityParentMaintenanceIssueCategoryID (may be optional) refers to an identifier of a parent category of type Activity. ActivityMaintenanceIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue refers to an identifier of the position of an activity in a sorted list. A MaintenanceIssueCategoryID can be unique in combination with a ParentMaintenanceIssueCategoryID and MaintenanceIssueCategoryCatalogueID.

Party Package

A Party package groups together all the relevant information in terms of a party.

VendorParty

A VendorParty is a party that delivers goods or provides services. InternalID (may be optional) refers to an identifier for a party. FormattedName (may be optional) refers to the complete formatted name of a party.

ManufacturerParty

A ManufacturerParty is a party that manufactures goods. InternalID (may be optional) refers to an identifier for a party. FormattedName (may be optional) refers to a complete formatted name of a party.

Party

A Party is a natural person, organization, or business partner group that is involved in a MaintenanceRequest. This could be a person, organization or group inside or outside of the company. InternalID (may be optional) refers to an identifier for a party. RoleCode (may be optional) refers to a coded representation of a PartyRole. FormattedName (may be optional) refers to a complete formatted name of a party.

Message Data Type

The message data type MaintenanceRequestCreateConfirmationMessage_sync contains the business information that is relevant for sending a business document in a message, the Maintenance Request included in the business document, and the Log. FIG. 287 shows a MaintenanceRequestCreateConfirmationMessage_sync 28700 package. The MaintenanceRequestCreateConfirmationMessage_sync 28700 package is a MaintenanceRequestCreateConfirmationMessage_sync 28704 datatype. The MaintenanceRequestCreateConfirmationMessage_sync 28700 package includes a MaintenanceRequestCreateConfirmationMessage_sync 28702 entity. The MaintenanceRequestCreateConfirmationMessage_sync 28700 package includes various packages, namely MessageHeader 28706, MaintenanceRequest 28714 and Log 28726.

The MessageHeader 28706 package is a BasicBusinessDocumentMessageHeader 28712 datatype. The MessageHeader 28706 package includes a MessageHeader 28708 entity.

The MessageHeader 28708 entity has a cardinality of zero or one 28710 meaning that for each instance of the MaintenanceRequestCreateConfirmationMessage_sync 28702 entity there may be one MessageHeader 28708 entity.

The MaintenanceRequest 28714 package includes a MaintenanceRequest 28716 entity.

The MaintenanceRequest 28716 entity has a cardinality of one 28718 meaning that for each instance of the MaintenanceRequestCreateConfirmationMessage_sync 28702 entity there is one MaintenanceRequest 28716 entity. The MaintenanceRequest 28716 entity includes an ID 28720 attribute.

The ID 28720 attribute is a MaintenanceRequestID 28724 datatype. The ID 28720 attribute has a cardinality of one 28722 meaning that for each instance of the MaintenanceRequest 28716 entity there is one ID 28720 attribute.

The Log 28726 package is a Log 28732 datatype. The Log 28726 package includes a Log 28728 entity.

The Log 28728 entity has a cardinality of one 28730 meaning that for each instance of the MaintenanceRequestCreateConfirmationMessage_sync 28702 entity there is one Log 28728 entity.

MaintenanceRequest Package

The MaintenanceRequest package groups the MaintenanceRequest with its entities.

MaintenanceRequest

A MaintenanceRequest is a request for maintenance of a product or an installation point. ID refers to an identifier for a maintenance request.

Log Package

A Log package groups the error messages used for user interaction

Log

A Log is a sequence of messages that result when an application executes a task.

Message Data Type

The message data type MaintenanceRequestChangeRequestMessage_sync contains the business information that is relevant for sending a business document in a message and the Maintenance Request included in the business document. FIGS. 283-1 through 283-20 show a MaintenanceRequestChangeRequestMessage_sync 28300 package. The MaintenanceRequestChangeRequestMessage_sync 28300 package is a MaintenanceRequestChangeRequestMessage_sync 28304 datatype. The MaintenanceRequestChangeRequestMessage_sync 28300 package includes a MaintenanceRequestChangeRequestMessage_sync 28302 entity. The MaintenanceRequestChangeRequestMessage_sync 28300 package includes various packages, namely MessageHeader 28306 and MaintenanceRequest 28314.

The MessageHeader 28306 package is a BasicBusinessDocumentMessageHeader 28312 datatype. The MessageHeader 28306 package includes a MessageHeader 28308 entity.

The MaintenanceRequest 28314 package includes a MaintenanceRequest 28316 entity. The MaintenanceRequest 28314 package includes various packages, namely Item 283176, Task 283444 and Activity 283520.

The MaintenanceRequest 28316 entity includes various attributes, namely ID 28320, ProjectWorkBreakdownStructureElementID 28326, IssueMaintenanceIssueCategoryCatalogueID 28332, IssueParentMaintenanceIssueCategoryID 28338, IssueMaintenanceIssueCategoryID 28344, MaterialInternalID 28350, InstallationPointID 28356, IndividualMaterialID 28362, SerialID 28368, MaintenancePlantID 28374, MaintenancePlanningPlantID 28380, MaintenanceWorkCentreID 28386, MaintenanceWorkCentrePlantID 28392, ReporterInternalID 28398, LocationInternalID 283104, AffectedInstallationPointID 283110, AffectedIndividualMaterialID 283116, ReportedDateTime 283122, ImportanceCode 283128, ProductionPlannerGroupCode 283134, RequestedProcessingPeriod 283140, MachineryBreakdownIndicator 283146, MachineryMalfunctionPeriod 283152, MachineryBreakdownDuration 283158, Description 283164 and DetailedText 283170.

The ID 28320 attribute is a MaintenanceRequestID 28324 datatype. The ID 28320 attribute has a cardinality of one 28322 meaning that for each instance of the MaintenanceRequest 28316 entity there is one ID 28320 attribute.

The ProjectWorkBreakdownStructureElementID 28326 attribute is a ProjectWorkBreakdownStructureElementID 28330 datatype. The ProjectWorkBreakdownStructureElementID 28326 attribute has a cardinality of zero or one 28328 meaning that for each instance of the MaintenanceRequest 28316 entity there may be one ProjectWorkBreakdownStructureElementID 28326 attribute.

The IssueMaintenanceIssueCategoryCatalogueID 28332 attribute is a MaintenanceIssueCategoryCatalogueID 28336 datatype. The IssueMaintenanceIssueCategoryCatalogueID 28332 attribute has a cardinality of zero or one 28334 meaning that for each instance of the MaintenanceRequest 28316 entity there may be one IssueMaintenanceIssueCategoryCatalogueID 28332 attribute.

The IssueParentMaintenanceIssueCategoryID 28338 attribute is a MaintenanceIssueCategoryID 28342 datatype. The IssueParentMaintenanceIssueCategoryID 28338 attribute has a cardinality of zero or one 28340 meaning that for each instance of the MaintenanceRequest 28316 entity there may be one IssueParentMaintenanceIssueCategoryID 28338 attribute.

The IssueMaintenanceIssueCategoryID 28344 attribute is a MaintenanceIssueCategoryID 28348 datatype. The IssueMaintenanceIssueCategoryID 28344 attribute has a cardinality of zero or one 28346 meaning that for each instance of the MaintenanceRequest 28316 entity there may be one IssueMaintenanceIssueCategoryID 28344 attribute.

The MaterialInternalID 28350 attribute is a ProductInternalID 28354 datatype. The MaterialInternalID 28350 attribute has a cardinality of zero or one 28352 meaning that for each instance of the MaintenanceRequest 28316 entity there may be one MaterialInternalID 28350 attribute.

The InstallationPointID 28356 attribute is an InstallationPointID 28360 datatype. The InstallationPointID 28356 attribute has a cardinality of zero or one 28358 meaning that for each instance of the MaintenanceRequest 28316 entity there may be one InstallationPointID 28356 attribute.

The IndividualMaterialID 28362 attribute is a ProductInternalID 28366 datatype. The IndividualMaterialID 28362 attribute has a cardinality of zero or one 28364 meaning that for each instance of the MaintenanceRequest 28316 entity there may be one IndividualMaterialID 28362 attribute.

The SerialID 28368 attribute is a SerialID 28372 datatype. The SerialID 28368 attribute has a cardinality of zero or one 28370 meaning that for each instance of the MaintenanceRequest 28316 entity there may be one SerialID 28368 attribute.

The MaintenancePlantID 28374 attribute is a PlantID 28378 datatype. The MaintenancePlantID 28374 attribute has a cardinality of zero or one 28376 meaning that for each instance of the MaintenanceRequest 28316 entity there may be one MaintenancePlantID 28374 attribute.

The MaintenancePlanningPlantID 28380 attribute is a PlantID 28384 datatype. The MaintenancePlanningPlantID 28380 attribute has a cardinality of zero or one 28382 meaning that for each instance of the MaintenanceRequest 28316 entity there may be one MaintenancePlanningPlantID 28380 attribute.

The MaintenanceWorkCentreID 28386 attribute is a WorkCentreID 28390 datatype. The MaintenanceWorkCentreID 28386 attribute has a cardinality of zero or one 28388 meaning that for each instance of the MaintenanceRequest 28316 entity there may be one MaintenanceWorkCentreID 28386 attribute.

The MaintenanceWorkCentrePlantID 28392 attribute is a PlantID 28396 datatype. The MaintenanceWorkCentrePlantID 28392 attribute has a cardinality of zero or one 28394 meaning that for each instance of the MaintenanceRequest 28316 entity there may be one MaintenanceWorkCentrePlantID 28392 attribute.

The ReporterInternalID 28398 attribute is a PartyInternalID 283102 datatype. The ReporterInternalID 28398 attribute has a cardinality of zero or one 283100 meaning that for each instance of the MaintenanceRequest 28316 entity there may be one ReporterInternalID 28398 attribute.

The LocationInternalID 283104 attribute is a LocationInternalID 283108 datatype. The LocationInternalID 283104 attribute has a cardinality of zero or one 283106 meaning that for each instance of the MaintenanceRequest 28316 entity there may be one LocationInternalID 283104 attribute.

The AffectedInstallationPointID 283110 attribute is an InstallationPointID 283114 datatype. The AffectedInstallationPointID 283110 attribute has a cardinality of zero or one 283112 meaning that for each instance of the MaintenanceRequest 28316 entity there may be one AffectedInstallationPointID 283110 attribute.

The AffectedIndividualMaterialID 283116 attribute is a ProductInternalID 283120 datatype. The AffectedIndividualMaterialID 283116 attribute has a cardinality of zero or one 283118 meaning that for each instance of the MaintenanceRequest 28316 entity there may be one AffectedIndividualMaterialID 283116 attribute.

The ReportedDateTime 283122 attribute is a TIMEZONEINDEPENDENT_DateTime 283126 datatype. The ReportedDateTime 283122 attribute has a cardinality of zero or one 283124 meaning that for each instance of the MaintenanceRequest 28316 entity there may be one ReportedDateTime 283122 attribute.

The ImportanceCode 283128 attribute is an ImportanceCode 283132 datatype. The ImportanceCode 283128 attribute has a cardinality of zero or one 283130 meaning that for each instance of the MaintenanceRequest 28316 entity there may be one ImportanceCode 283128 attribute.

The ProductionPlannerGroupCode 283134 attribute is a ProductionPlannerGroupCode 283138 datatype. The ProductionPlannerGroupCode 283134 attribute has a cardinality of zero or one 283136 meaning that for each instance of the MaintenanceRequest 28316 entity there may be one ProductionPlannerGroupCode 283134 attribute.

The RequestedProcessingPeriod 283140 attribute is an UPPEROPEN_TIMEZONEINDEPENDENT_ DateTimePeriod 283144 datatype. The RequestedProcessingPeriod 283140 attribute has a cardinality of zero or one 283142 meaning that for each instance of the MaintenanceRequest 28316 entity there may be one RequestedProcessingPeriod 283140 attribute.

The MachineryBreakdownIndicator 283146 attribute is an Indicator 283150 datatype. The MachineryBreakdownIndicator 283146 attribute has a cardinality of zero or one 283148 meaning that for each instance of the MaintenanceRequest 28316 entity there may be one MachineryBreakdownIndicator 283146 attribute.

The MachineryMalfunctionPeriod 283152 attribute is an UPPEROPEN_TIMEZONEINDEPENDENT_ DateTimePeriod 283156 datatype. The MachineryMalfunctionPeriod 283152 attribute has a cardinality of zero or one 283154 meaning that for each instance of the MaintenanceRequest 28316 entity there may be one MachineryMalfunctionPeriod 283152 attribute.

The MachineryBreakdownDuration 283158 attribute is a Duration 283162 datatype. The MachineryBreakdownDuration 283158 attribute has a cardinality of zero or one 283160 meaning that for each instance of the MaintenanceRequest 28316 entity there may be one MachineryBreakdownDuration 283158 attribute.

The Description 283164 attribute is a SHORT_Description 283168 datatype. The Description 283164 attribute has a cardinality of zero or one 283166 meaning that for each instance of the MaintenanceRequest 28316 entity there may be one Description 283164 attribute.

The DetailedText 283170 attribute is a Text 283174 datatype. The DetailedText 283170 attribute has a cardinality of zero or one 283172 meaning that for each instance of the MaintenanceRequest 28316 entity there may be one DetailedText 283170 attribute.

The Item 283176 package includes an Item 283178 entity. The Item 283176 package includes various packages, namely Cause 283254, Task 283308 and Activity 283384.

The Item 283178 entity has a cardinality of zero or n 283180 meaning that for each instance of the MaintenanceRequest 28316 entity there may be one or more Item 283178 entities. The Item 283178 entity includes various attributes, namely ID 283182, MaterialInternalID 283188, DamageMaintenanceIssueCategoryCatalogueID 283194, DamageParentMaintenanceIssueCategoryID 283200, DamageMaintenanceIssueCategoryID 283206, ObjectPartMaintenanceIssueCategoryCatalogueID 283212, ObjectPartParentMaintenanceIssueCategoryID 283218, ObjectPartMaintenanceIssueCategoryID 283224, Description 283230, DetailedText 283236, OrdinalNumberValue 283242 and @actionCode 283248.

The ID 283182 attribute is a MaintenanceRequestItemID 283186 datatype. The ID 283182 attribute has a cardinality of one 283184 meaning that for each instance of the Item 283178 entity there is one ID 283182 attribute.

The MaterialInternalID 283188 attribute is a ProductInternalID 283192 datatype. The MaterialInternalID 283188 attribute has a cardinality of zero or one 283190 meaning that for each instance of the Item 283178 entity there may be one MaterialInternalID 283188 attribute.

The DamageMaintenanceIssueCategoryCatalogueID 283194 attribute is a MaintenanceIssueCategoryCatalogueID 283198 datatype. The DamageMaintenanceIssueCategoryCatalogueID 283194 attribute has a cardinality of zero or one 283196 meaning that for each instance of the Item 283178 entity there may be one DamageMaintenanceIssueCategoryCatalogueID 283194 attribute.

The DamageParentMaintenanceIssueCategoryID 283200 attribute is a MaintenanceIssueCategoryID 283204 datatype. The DamageParentMaintenanceIssueCategoryID 283200 attribute has a cardinality of zero or one 283202 meaning that for each instance of the Item 283178 entity there may be one DamageParentMaintenanceIssueCategoryID 283200 attribute.

The DamageMaintenanceIssueCategoryID 283206 attribute is a MaintenanceIssueCategoryID 283210 datatype. The DamageMaintenanceIssueCategoryID 283206 attribute has a cardinality of zero or one 283208 meaning that for each instance of the Item 283178 entity there may be one DamageMaintenanceIssueCategoryID 283206 attribute.

The ObjectPartMaintenanceIssueCategoryCatalogueID 283212 attribute is a MaintenanceIssueCategoryCatalogueID 283216 datatype. The ObjectPartMaintenanceIssueCategoryCatalogueID 283212 attribute has a cardinality of zero or one 283214 meaning that for each instance of the Item 283178 entity there may be one ObjectPartMaintenanceIssueCategoryCatalogueID 283212 attribute.

The ObjectPartParentMaintenanceIssueCategoryID 283218 attribute is a MaintenanceIssueCategoryID 283222 datatype. The ObjectPartParentMaintenanceIssueCategoryID 283218 attribute has a cardinality of zero or one 283220 meaning that for each instance of the Item 283178 entity there may be one ObjectPartParentMaintenanceIssueCategoryID 283218 attribute.

The ObjectPartMaintenanceIssueCategoryID 283224 attribute is a MaintenanceIssueCategoryID 283228 datatype. The ObjectPartMaintenanceIssueCategoryID 283224 attribute has a cardinality of zero or one 283226 meaning that for each instance of the Item 283178 entity there may be one ObjectPartMaintenanceIssueCategoryID 283224 attribute.

The Description 283230 attribute is a SHORT_Description 283234 datatype. The Description 283230 attribute has a cardinality of zero or one 283232 meaning that for each instance of the Item 283178 entity there may be one Description 283230 attribute.

The DetailedText 283236 attribute is a Text 283240 datatype. The DetailedText 283236 attribute has a cardinality of zero or one 283238 meaning that for each instance of the Item 283178 entity there may be one DetailedText 283236 attribute.

The OrdinalNumberValue 283242 attribute is an OrdinalNumberValue 283246 datatype. The OrdinalNumberValue 283242 attribute has a cardinality of one 283244 meaning that for each instance of the Item 283178 entity there is one OrdinalNumberValue 283242 attribute.

The @actionCode 283248 attribute is an ActionCode 283252 datatype. The @actionCode 283248 attribute has a cardinality of one 283250 meaning that for each instance of the Item 283178 entity there is one @actionCode 283248 attribute.

The Cause 283254 package includes a Cause 283256 entity.

The Cause 283256 entity has a cardinality of zero or n 283258 meaning that for each instance of the Item 283178 entity there may be one or more Cause 283256 entities. The Cause 283256 entity includes various attributes, namely ID 283260, CauseMaintenanceIssueCategoryCatalogueID 283266, CauseParentMaintenanceIssueCategoryID 283272, CauseMaintenanceIssueCategoryID 283278, Description 283284, DetailedText 283290, OrdinalNumberValue 283296 and @actionCode 283302.

The ID 283260 attribute is a MaintenanceRequestCauseID 283264 datatype. The ID 283260 attribute has a cardinality of one 283262 meaning that for each instance of the Cause 283256 entity there is one ID 283260 attribute.

The CauseMaintenanceIssueCategoryCatalogueID 283266 attribute is a MaintenanceIssueCategoryCatalogueID 283270 datatype. The CauseMaintenanceIssueCategoryCatalogueID 283266 attribute has a cardinality of zero or one 283268 meaning that for each instance of the Cause 283256 entity there may be one CauseMaintenanceIssueCategoryCatalogueID 283266 attribute.

The CauseParentMaintenanceIssueCategoryID 283272 attribute is a MaintenanceIssueCategoryID 283276 datatype. The CauseParentMaintenanceIssueCategoryID 283272 attribute has a cardinality of zero or one 283274 meaning that for each instance of the Cause 283256 entity there may be one CauseParentMaintenanceIssueCategoryID 283272 attribute.

The CauseMaintenanceIssueCategoryID 283278 attribute is a MaintenanceIssueCategoryID 283282 datatype. The CauseMaintenanceIssueCategoryID 283278 attribute has a cardinality of zero or one 283280 meaning that for each instance of the Cause 283256 entity there may be one CauseMaintenanceIssueCategoryID 283278 attribute.

The Description 283284 attribute is a SHORT_Description 283288 datatype. The Description 283284 attribute has a cardinality of zero or one 283286 meaning that for each instance of the Cause 283256 entity there may be one Description 283284 attribute.

The DetailedText 283290 attribute is a Text 283294 datatype. The DetailedText 283290 attribute has a cardinality of zero or one 283292 meaning that for each instance of the Cause 283256 entity there may be one DetailedText 283290 attribute.

The OrdinalNumberValue 283296 attribute is an OrdinalNumberValue 283300 datatype. The OrdinalNumberValue 283296 attribute has a cardinality of one 283298 meaning that for each instance of the Cause 283256 entity there is one OrdinalNumberValue 283296 attribute.

The @actionCode 283302 attribute is an ActionCode 283306 datatype. The @actionCode 283302 attribute has a cardinality of one 283304 meaning that for each instance of the Cause 283256 entity there is one @actionCode 283302 attribute.

The Task 283308 package includes a Task 283310 entity.

The Task 283310 entity has a cardinality of zero or n 283312 meaning that for each instance of the Item 283178 entity there may be one or more Task 283310 entities. The Task 283310 entity includes various attributes, namely ID 283314, EmployeeResponsibleInternalID 283320, CompleterInternalID 283326, TaskMaintenanceIssueCategoryCatalogueID 283332, TaskParentMaintenanceIssueCategoryID 283338 and TaskMaintenanceIssueCategoryID 283344. The Task 283310 entity has various subordinate entities, namely EmployeeResponsibleInternalTypeCode 283350, PlannedProcessingPeriod 283354, Description 283360, DetailedText 283366, OrdinalNumberValue 283372 and @actionCode 283378.

The ID 283314 attribute is a MaintenanceRequestTaskID 283318 datatype. The ID 283314 attribute has a cardinality of one 283316 meaning that for each instance of the Task 283310 entity there is one ID 283314 attribute.

The EmployeeResponsibleInternalID 283320 attribute is a PartyInternalID 283324 datatype. The EmployeeResponsibleInternalID 283320 attribute has a cardinality of zero or one 283322 meaning that for each instance of the Task 283310 entity there may be one EmployeeResponsibleInternalID 283320 attribute.

The CompleterInternalID 283326 attribute is a PartyInternalID 283330 datatype. The CompleterInternalID 283326 attribute has a cardinality of zero or one 283328 meaning that for each instance of the Task 283310 entity there may be one CompleterInternalID 283326 attribute.

The TaskMaintenanceIssueCategoryCatalogueID 283332 attribute is a MaintenanceIssueCategoryCatalogueID 283336 datatype. The TaskMaintenanceIssueCategoryCatalogueID 283332 attribute has a cardinality of zero or one 283334 meaning that for each instance of the Task 283310 entity there may be one TaskMaintenanceIssueCategoryCatalogueID 283332 attribute.

The TaskParentMaintenanceIssueCategoryID 283338 attribute is a MaintenanceIssueCategoryID 283342 datatype. The TaskParentMaintenanceIssueCategoryID 283338 attribute has a cardinality of zero or one 283340 meaning that for each instance of the Task 283310 entity there may be one TaskParentMaintenanceIssueCategoryID 283338 attribute.

The TaskMaintenanceIssueCategoryID 283344 attribute is a MaintenanceIssueCategoryID 283348 datatype. The TaskMaintenanceIssueCategoryID 283344 attribute has a cardinality of zero or one 283346 meaning that for each instance of the Task 283310 entity there may be one TaskMaintenanceIssueCategoryID 283344 attribute.

The EmployeeResponsibleInternalTypeCode 283350 entity has a cardinality of zero or one 283352 meaning that for each instance of the Task 283310 entity there may be one EmployeeResponsibleInternalTypeCode 283350 entity.

The PlannedProcessingPeriod 283354 entity has a cardinality of zero or one 283356 meaning that for each instance of the Task 283310 entity there may be one PlannedProcessingPeriod 283354 entity.

The Description 283360 entity has a cardinality of zero or one 283362 meaning that for each instance of the Task 283310 entity there may be one Description 283360 entity.

The DetailedText 283366 entity has a cardinality of zero or one 283368 meaning that for each instance of the Task 283310 entity there may be one DetailedText 283366 entity. The DetailedText 283366 entity includes various attributes, namely 1 283374 and 1 283380.

The 1 283374 attribute is an OrdinalNumberValue 283376 datatype. The one 283374 attribute has a cardinality of one 283374 meaning that for each instance of the DetailedText 283366 entity there is one 283374 attribute.

The 1 283380 attribute is an ActionCode 283382 datatype. The one 283380 attribute has a cardinality of one 283380 meaning that for each instance of the DetailedText 283366 entity there is one 283380 attribute.

The OrdinalNumberValue 283372 entity has a cardinality of one 283374 meaning that for each instance of the Task 283310 entity there is one OrdinalNumberValue 283372 entity. The OrdinalNumberValue 283372 entity includes a 1 283380 attribute.

The 1 283380 attribute is an ActionCode 283382 datatype. The one 283380 attribute has a cardinality of one 283380 meaning that for each instance of the OrdinalNumberValue 283372 entity there is one 283380 attribute.

The @actionCode 283378 entity has a cardinality of one 283380 meaning that for each instance of the Task 283310 entity there is one @actionCode 283378 entity.

The Activity 283384 package includes an Activity 283386 entity.

The Activity 283386 entity has a cardinality of zero or n 283388 meaning that for each instance of the Item 283178 entity there may be one or more Activity 283386 entities. The Activity 283386 entity includes various attributes, namely ID 283390, ActivityMaintenanceIssueCategoryCatalogueID 283396, ActivityParentMaintenanceIssueCategoryID 283402, ActivityMaintenanceIssueCategoryID 283408, ProcessingPeriod 283414, Description 283420, DetailedText 283426, OrdinalNumberValue 283432 and @actionCode 283438.

The ID 283390 attribute is a MaintenanceRequestActivityID 283394 datatype. The ID 283390 attribute has a cardinality of one 283392 meaning that for each instance of the Activity 283386 entity there is one ID 283390 attribute.

The ActivityMaintenanceIssueCategoryCatalogueID 283396 attribute is a MaintenanceIssueCategoryCatalogueID 283400 datatype. The ActivityMaintenanceIssueCategoryCatalogueID 283396 attribute has a cardinality of zero or one 283398 meaning that for each instance of the Activity 283386 entity there may be one ActivityMaintenanceIssueCategoryCatalogueID 283396 attribute.

The ActivityParentMaintenanceIssueCategoryID 283402 attribute is a MaintenanceIssueCategoryID 283406 datatype. The ActivityParentMaintenanceIssueCategoryID 283402 attribute has a cardinality of zero or one 283404 meaning that for each instance of the Activity 283386 entity there may be one ActivityParentMaintenanceIssueCategoryID 283402 attribute.

The ActivityMaintenanceIssueCategoryID 283408 attribute is a MaintenanceIssueCategoryID 283412 datatype. The ActivityMaintenanceIssueCategoryID 283408 attribute has a cardinality of zero or one 283410 meaning that for each instance of the Activity 283386 entity there may be one ActivityMaintenanceIssueCategoryID 283408 attribute.

The ProcessingPeriod 283414 attribute is an UPPEROPEN_TIMEZONEINDEPENDENT_DateTimePeriod 283418 datatype. The ProcessingPeriod 283414 attribute has a cardinality of zero or one 283416 meaning that for each instance of the Activity 283386 entity there may be one ProcessingPeriod 283414 attribute.

The Description 283420 attribute is a SHORT Description 283424 datatype. The Description 283420 attribute has a cardinality of zero or one 283422 meaning that for each instance of the Activity 283386 entity there may be one Description 283420 attribute.

The DetailedText 283426 attribute is a Text 283430 datatype. The DetailedText 283426 attribute has a cardinality of zero or one 283428 meaning that for each instance of the Activity 283386 entity there may be one DetailedText 283426 attribute.

The OrdinalNumberValue 283432 attribute is an OrdinalNumberValue 283436 datatype. The OrdinalNumberValue 283432 attribute has a cardinality of one 283434 meaning that for each instance of the Activity 283386 entity there is one OrdinalNumberValue 283432 attribute.

The @actionCode 283438 attribute is an ActionCode 283442 datatype. The @actionCode 283438 attribute has a cardinality of one 283440 meaning that for each instance of the Activity 283386 entity there is one @actionCode 283438 attribute.

The Task 283444 package includes a Task 283446 entity.

The Task 283446 entity has a cardinality of zero or n 283448 meaning that for each instance of the MaintenanceRequest 28316 entity there may be one or more Task 283446 entities. The Task 283446 entity includes various attributes, namely ID 283450, EmployeeResponsibleInternalID 283456, CompleterInternalID 283462, TaskMaintenanceIssueCategoryCatalogueID 283468, TaskParentMaintenanceIssueCategoryID 283474 and TaskMaintenanceIssueCategoryID 283480. The Task 283446 entity has various subordinate entities, namely EmployeeResponsibleInternalTypeCode 283486, PlannedProcessingPeriod 283490, Description 283496, DetailedText 283502, OrdinalNumberValue 283508 and @actionCode 283514.

The ID 283450 attribute is a MaintenanceRequestTaskID 283454 datatype. The ID 283450 attribute has a cardinality of one 283452 meaning that for each instance of the Task 283446 entity there is one ID 283450 attribute.

The EmployeeResponsibleInternalID 283456 attribute is a PartyInternalID 283460 datatype. The EmployeeResponsibleInternalID 283456 attribute has a cardinality of zero or one 283458 meaning that for each instance of the Task 283446 entity there may be one EmployeeResponsibleInternalID 283456 attribute.

The CompleterInternalID 283462 attribute is a PartyInternalID 283466 datatype. The CompleterInternalID 283462 attribute has a cardinality of zero or one 283464 meaning that for each instance of the Task 283446 entity there may be one CompleterInternalID 283462 attribute.

The TaskMaintenanceIssueCategoryCatalogueID 283468 attribute is a MaintenanceIssueCategoryCatalogueID 283472 datatype. The TaskMaintenanceIssueCategoryCatalogueID 283468 attribute has a cardinality of zero or one 283470 meaning that for each instance of the Task 283446 entity there may be one TaskMaintenanceIssueCategoryCatalogueID 283468 attribute.

The TaskParentMaintenanceIssueCategoryID 283474 attribute is a MaintenanceIssueCategoryID 283478 datatype. The TaskParentMaintenanceIssueCategoryID 283474 attribute has a cardinality of zero or one 283476 meaning that for each instance of the Task 283446 entity there may be one TaskParentMaintenanceIssueCategoryID 283474 attribute.

The TaskMaintenanceIssueCategoryID 283480 attribute is a MaintenanceIssueCategoryID 283484 datatype. The TaskMaintenanceIssueCategoryID 283480 attribute has a cardinality of zero or one 283482 meaning that for each instance of the Task 283446 entity there may be one TaskMaintenanceIssueCategoryID 283480 attribute.

The EmployeeResponsibleInternalTypeCode 283486 entity has a cardinality of zero or one 283488 meaning that for each instance of the Task 283446 entity there may be one EmployeeResponsibleInternalTypeCode 283486 entity.

The PlannedProcessingPeriod 283490 entity has a cardinality of zero or one 283492 meaning that for each instance of the Task 283446 entity there may be one PlannedProcessingPeriod 283490 entity.

The Description 283496 entity has a cardinality of zero or one 283498 meaning that for each instance of the Task 283446 entity there may be one Description 283496 entity.

The DetailedText 283502 entity has a cardinality of zero or one 283504 meaning that for each instance of the Task 283446 entity there may be one DetailedText 283502 entity.

The OrdinalNumberValue 283508 entity has a cardinality of one 283510 meaning that for each instance of the Task 283446 entity there is one OrdinalNumberValue 283508 entity.

The @actionCode 283514 entity has a cardinality of one 283516 meaning that for each instance of the Task 283446 entity there is one @actionCode 283514 entity.

The Activity 283520 package includes an Activity 283522 entity.

The Activity 283522 entity has a cardinality of zero or n 283524 meaning that for each instance of the MaintenanceRequest 28316 entity there may be one or more Activity 283522 entities. The Activity 283522 entity includes various attributes, namely ID 283526, ActivityMaintenanceIssueCategoryCatalogueID 283532, ActivityParentMaintenanceIssueCategoryID 283538, ActivityMaintenanceIssueCategoryID 283544, ProcessingPeriod 283550, Description 283556, DetailedText 283562, OrdinalNumberValue 283568 and @actionCode 283574.

The ID 283526 attribute is a MaintenanceRequestActivityID 283530 datatype. The ID 283526 attribute has a cardinality of one 283528 meaning that for each instance of the Activity 283522 entity there is one ID 283526 attribute.

The ActivityMaintenanceIssueCategoryCatalogueID 283532 attribute is a MaintenanceIssueCategoryCatalogueID 283536 datatype. The ActivityMaintenanceIssueCategoryCatalogueID 283532 attribute has a cardinality of zero or one 283534 meaning that for each instance of the Activity 283522 entity there may be one ActivityMaintenanceIssueCategoryCatalogueID 283532 attribute.

The ActivityParentMaintenanceIssueCategoryID 283538 attribute is a MaintenanceIssueCategoryID 283542 datatype. The ActivityParentMaintenanceIssueCategoryID 283538 attribute has a cardinality of zero or one 283540 meaning that for each instance of the Activity 283522 entity there may be one ActivityParentMaintenanceIssueCategoryID 283538 attribute.

The ActivityMaintenanceIssueCategoryID 283544 attribute is a MaintenanceIssueCategoryID 283548 datatype. The ActivityMaintenanceIssueCategoryID 283544 attribute has a cardinality of zero or one 283546 meaning that for each instance of the Activity 283522 entity there may be one ActivityMaintenanceIssueCategoryID 283544 attribute.

The ProcessingPeriod 283550 attribute is an UPPEROPEN_TIMEZONEINDEPENDENT_DateTimePeriod 283554 datatype. The ProcessingPeriod 283550 attribute has a cardinality of zero or one 283552 meaning that for each instance of the Activity 283522 entity there may be one ProcessingPeriod 283550 attribute.

The Description 283556 attribute is a SHORT Description 283560 datatype. The Description 283556 attribute has a cardinality of zero or one 283558 meaning that for each instance of the Activity 283522 entity there may be one Description 283556 attribute.

The DetailedText 283562 attribute is a Text 283566 datatype. The DetailedText 283562 attribute has a cardinality of zero or one 283564 meaning that for each instance of the Activity 283522 entity there may be one DetailedText 283562 attribute.

The OrdinalNumberValue 283568 attribute is an OrdinalNumberValue 283572 datatype. The OrdinalNumberValue 283568 attribute has a cardinality of one 283570 meaning that for each instance of the Activity 283522 entity there is one OrdinalNumberValue 283568 attribute.

The @actionCode 283574 attribute is an ActionCode 283578 datatype. The @actionCode 283574 attribute has a cardinality of one 283576 meaning that for each instance of the Activity 283522 entity there is one @actionCode 283574 attribute.

MaintenanceRequest Package

The MaintenanceRequest package groups the MaintenanceRequest with its entities.

MaintenanceRequest

A MaintenanceRequest is a request for maintenance of a product or an installation point. Maintenance requests document maintenance tasks completely, and make them available for analysis in the long term. It also helps in preliminary planning and execution of tasks.

ID refers to an identifier for a maintenance request. ProjectWorkBreakdownStructureElementID (may be optional) refers to an identifier for a Project Work Breakdown Structure Element. A Project Work Breakdown Structure (WBS) organizes the different tasks involved in the project in a hierarchical structure. The WBS consists of a number of WBS elements. A WBS element represents a certain task or a partial task that can be subdivided further. IssueMaintenanceIssueCategoryCatalogueID (may be optional) refers to an identifier for a catalogue of categories for maintenance-related issues of type Issue. IssueParentMaintenanceIssueCategoryID (may be optional) may be directly superordinate to a particular category, it is an identifier for a category of a maintenance-related issue of type Issue. IssueMaintenanceIssueCategoryID (may be optional) refers to an identifier for a category of a maintenance-related issue of type Subject. MaterialInternalID (may be optional) refers to a proprietary identifier for a material. This is the identifier of a material for which maintenance request is being created. InstallationPointID (may be optional) refers to a unique identifier for an installation point. It is the identifier of an installation point for which maintenance request is being created. IndividualMaterialID (may be optional) refers to a proprietary identifier for an individual material. It is the identifier of an individual material for which maintenance request is being created. SerialID (may be optional) refers to a unique identifier for an individual material that is assigned in the maintenance request. MaintenancePlantID (may be optional) refers to an identifier of a plant in which the product and installation point of a company are installed and maintained. MaintenancePlanningPlantID (may be optional) refers to an identifier of a plant in which the planning and the supervision of the execution of maintenance work is done. MaintenanceWorkCentreID (may be optional) refers to an identifier of a WorkCentre where the execution of maintenance work is done. MaintenanceWorkCentrePlantID (may be optional) refers to an identifier of a Plant where the work centre which is responsible for the execution of maintenance work is present. ReporterInternalID (may be optional) refers to a proprietary identifier for a party which reports a maintenance request. LocationInternalID (may be optional) refers to a proprietary identifier for a location of the product or installation point that has to be maintained within a maintenance plant. AffectedInstallationPointID (may be optional) refers to an unique identifier of an installation point which has a side effect by the maintenance request. AffectedIndividualMaterialID (may be optional) refers to a proprietary identifier of an individual material which has a side effect by the maintenance request. ImportanceCode (may be optional) refers to the coded representation of the importance of maintenance request. ProductionPlannerGroupCode (may be optional) refers to the coded representation of a MaintenancePlannerGroup. RequestedProcessingPeriod (may be optional) refers to a Period is a period during which processing of the maintenance request is requested. MachineryBreakdownIndicator (may be optional) refers to the representation of machinery in the state of breakdown. It indicates whether the machinery is in the state of breakdown or not. MachineryMalfunctionPeriod (may be optional) refers to a Period is a period during which machinery has or had malfunctions. MachineryBreakdownDuration (may be optional) refers to a period of time of a particular length without a fixed start or end time, during which a machinery is in the state breakdown. MachineryBreakdownDuration can be entered when the MachineryBreakdownIndicator is set to true. Description (may be optional) refers to a representation of the properties of a maintenance request in natural language. DetailedText (may be optional) refers to a language-dependent specification for a maintenance request. A MaintenanceIssueCategoryID can be unique in combination with a ParentMaintenanceIssueCategoryID and MaintenanceIssueCategoryCatalogueID.

Item Package

An Item package groups together all the relevant information in terms of an item.

Item

An item is an individual problem or exceptional situation that has occurred with a product or an installation point. ID refers to an identifier for a maintenance request item. MaterialInternalID (may be optional) refers to a proprietary identifier for a material in a maintenance request item. DamageMaintenanceIssueCategoryCatalogueID (may be optional) refers to an identifier for a catalogue of categories for maintenance-related issues of type Damage. DamageParentMaintenanceIssueCategoryID (may be optional) may be directly superordinate to a particular category, it is an identifier for a category of a maintenance-related issue of type Subject. DamageMaintenanceIssueCategoryID (may be optional) refers to an identifier for a category of a maintenance-related issue of type Damage. ObjectPartMaintenanceIssueCategoryCatalogueID (may be optional) refers to an identifier for a catalogue of categories for maintenance-related issues of type ObjectPart. ObjectPartParentMaintenanceIssueCategoryID (may be optional) may be directly superordinate to a particular category, it is an identifier for a category of a maintenance-related issue of type ObjectPart. ObjectPartMaintenanceIssueCategoryID (may be optional) refers to an identifier for a category of a maintenance-related issue of type ObjectPart. Description (may be optional) refers to a representation of the properties of a maintenance request item in natural language. DetailedText (may be optional) refers to a language-dependent specification for a maintenance request item. OrdinalNumberValue refers to a number that indicates the position of a maintenance request item in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID. A maintenance request refers to an item but it is possible to create a maintenance request without one. It is possible to attach more than one task, activity and cause per item.

Cause

A Cause is a cause that led to the occurrence of the malfunction or exceptional situation in a product or an installation point. ID refers to an identifier for a maintenance request cause. CauseMaintenanceIssueCategoryCatalogueID (may be optional) refers to an identifier for a catalogue of categories for maintenance-related issues of type Cause. CauseParentMaintenanceIssueCategoryID (may be optional) may be directly superordinate to a particular category, it is an identifier for a category of a maintenance-related issue of type Cause. CauseMaintenanceIssueCategoryID (may be optional) refers to an identifier for a category of a maintenance-related issue of type Cause. Description (may be optional) refers to a representation of the properties of a maintenance request item cause in natural language. DetailedText (may be optional) refers to a language-dependent specification for a maintenance request item cause. OrdinalNumberValue refers to a number that indicates the position of an maintenance request item cause in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID.

Task

A Task is a long-term action required to rectify the malfunction or exceptional situation in a product or an installation point. ID refers to a task. EmployeeResponsibleInternalID (may be optional) refers to a proprietary identifier for a EmployeeResponsible who is responsible for processing a task. CompletorInternalID (may be optional) refers to an identifier of the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as the key for the task to be performed and a brief instruction describing what is to be done, the planned start and end dates for the task, and the task status.

Activity

An Activity is a short-term action that shall be executed immediately to rectify the malfunction or exceptional situation in a product or an installation point. ID refers to an identifier for an activity. ActivityMaintenanceIssueCategoryCatalogueID (may be optional) refers to an identifier of a maintenance issue category catalogue of type Activity. ActivityParentMaintenanceIssueCategoryID (may be optional) refers to an identifier of a parent category of type Activity. ActivityMaintenanceIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue refers to an identifier of the position of an activity in a sorted list. @actionCode defines the action to be performed. A MaintenanceIssueCategoryID can be unique in combination with a ParentMaintenanceIssueCategoryID and MaintenanceIssueCategoryCatalogueID.

Task Package

A Task package groups together all the relevant information in terms of a task.

Task

A Task is a long-term action required to rectify the malfunction or exceptional situation in a product or an installation point. ID refers to an identifies a task. EmployeeResponsibleInternalID (may be optional) refers to a proprietary identifier for a EmployeeResponsible who is responsible for processing a task. CompletorInternalID (may be optional) refers to an identifier of the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors.

@actionCode defines the action to be performed. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as a key for the task to be performed and a brief instruction describing what is to be done, the planned start and end dates for the task, and the task status Activity Package An Activity package groups together all the relevant information in terms of a activity.

Activity

An Activity is a short-term action that shall be executed immediately to rectify the malfunction or exceptional situation in a product or an installation point. ID refers to an identifier for an activity. ActivityMaintenanceIssueCategoryCatalogueID (may be optional) refers to a maintenance issue category catalogue of type Activity. ActivityParentMaintenanceIssueCategoryID (may be optional) refers to an identifier of a parent category of type Activity. ActivityMaintenanceIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue refers to an identifier of the position of an activity in a sorted list. @actionCode defines the action to be performed. A MaintenanceIssueCategoryID can be unique in combination with a ParentMaintenanceIssueCategoryID and MaintenanceIssueCategoryCatalogueID.

Party Package

A Party package groups together all the relevant information in terms of a party.

VendorParty

A VendorParty is a party that delivers goods or provides services. InternalID (may be optional) refers to an identifier for a party. FormattedName (may be optional) refers to a complete formatted name of a party.

ManufacturerParty

A ManufacturerParty is a party that manufactures goods. InternalID (may be optional) refers to an identifier for a party. FormattedName (may be optional) refers to a complete formatted name of a party.

Party

A Party is a natural person, organization, or business partner group that is involved in a MaintenanceRequest. This could be a person, organization or group inside or outside of the company. InternalID (may be optional) refers to an identifier for a party. RoleCode (may be optional) refers to a coded representation of a PartyRole. FormattedName (may be optional) refers to a complete formatted name of a party.

Message Data Type

The message data type MaintenanceRequestChangeConfirmationMessage_sync contains the business information that is relevant for sending a business document in a message, the Maintenance Request included in the business document, and the Log. FIG. 282 shows a MaintenanceRequestChangeConfirmationMessage_sync 28200 package. The MaintenanceRequestChangeConfirmationMessage_sync 28200 package is a MaintenanceRequestChangeConfirmationMessage_sync 28204 datatype. The MaintenanceRequestChangeConfirmationMessage_sync 28200 package includes a MaintenanceRequestChangeConfirmationMessage_sync 28202 entity. The MaintenanceRequestChangeConfirmationMessage_sync 28200 package includes various packages, namely MessageHeader 28206, MaintenanceRequest 28214 and Log 28226.

The MessageHeader 28206 package is a BasicBusinessDocumentMessageHeader 28212 datatype. The MessageHeader 28206 package includes a MessageHeader 28208 entity.

The MessageHeader 28208 entity has a cardinality of zero or one 28210 meaning that for each instance of the MaintenanceRequestChangeConfirmationMessage_sync 28202 entity there may be one MessageHeader 28208 entity.

The MaintenanceRequest 28214 package includes a MaintenanceRequest 28216 entity.

The MaintenanceRequest 28216 entity has a cardinality of zero or one 28218 meaning that for each instance of the MaintenanceRequestChangeConfirmationMessage_sync 28202 entity there may be one MaintenanceRequest 28216 entity. The MaintenanceRequest 28216 entity includes an ID 28220 attribute.

The ID 28220 attribute is a MaintenanceRequestID 28224 datatype. The ID 28220 attribute has a cardinality of one 28222 meaning that for each instance of the MaintenanceRequest 28216 entity there is one ID 28220 attribute.

The Log 28226 package is a LogC datatype. The Log 28226 package includes a Log 28228 entity.

The Log 28228 entity has a cardinality of one 28230 meaning that for each instance of the MaintenanceRequestChangeConfirmationMessage_sync 28202 entity there is one Log 28228 entity.

MaintenanceRequest Package

The MaintenanceRequest package groups the MaintenanceRequest with its entities.

MaintenanceRequest

A MaintenanceRequest is a request for maintenance of a product or an installation point. ID refers to an identifier for a maintenance request.

Log Package

A Log package groups the error messages used for user interaction

Log

A Log is a sequence of messages that result when an application executes a task.

Message Data Type

The message data type MaintenanceRequestChangeCheckQueryMessage_sync contains the Maintenance Request included in the business document. FIGS. 280-1 through 280-20 show a MaintenanceRequestChangeCheckQueryMessage_sync 28000 package. The MaintenanceRequestChangeCheckQueryMessage_sync 28000 package is a MaintenanceRequestChangeCheckQueryMessage_sync 28004 datatype. The MaintenanceRequestChangeCheckQueryMessage_sync 28000 package includes a MaintenanceRequestChangeCheckQueryMessage_sync 28002 entity. The MaintenanceRequestChangeCheckQueryMessage_sync 28000 package includes a MaintenanceRequest 28006 package.

The MaintenanceRequest 28006 package includes a MaintenanceRequest 28008 entity. The MaintenanceRequest 28006 package includes various packages, namely Item 280168, Task 280438 and Activity 280514.

The MaintenanceRequest 28008 entity has a cardinality of one 28010 meaning that for each instance of the MaintenanceRequestChangeCheckQueryMessage_sync 28002 entity there is one MaintenanceRequest 28008 entity. The MaintenanceRequest 28008 entity includes various attributes, namely ID 28012, ProjectWorkBreakdownStructureElementID 28018, IssueMaintenanceIssueCategoryCatalogueID 28024, IssueParentMaintenanceIssueCategoryID 28030, IssueMaintenanceIssueCategoryID 28036, MaterialInternalID 28042, InstallationPointID 28048, IndividualMaterialID 28054, SerialID 28060, MaintenancePlantID 28066, MaintenancePlanningPlantID 28072, MaintenanceWorkCentreID 28078, MaintenanceWorkCentrePlantID 28084, ReporterInternalID 28090, LocationInternalID 28096, AffectedInstallationPointID 280102, AffectedIndividualMaterialID 280108, ReportedDateTime 280114, ImportanceCode 280120, ProductionPlannerGroupCode 280126, RequestedProcessingPeriod 280132, MachineryBreakdownIndicator 280138, MachineryMalfunctionPeriod 280144, MachineryBreakdownDuration 280150, Description 280156 and DetailedText 280162.

The ID 28012 attribute is a MaintenanceRequestID 28016 datatype. The ID 28012 attribute has a cardinality of one 28014 meaning that for each instance of the MaintenanceRequest 28008 entity there is one ID 28012 attribute.

The ProjectWorkBreakdownStructureElementID 28018 attribute is a ProjectWorkBreakdownStructureElementID 28022 datatype. The ProjectWorkBreakdownStructureElementID 28018 attribute has a cardinality of zero or one 28020 meaning that for each instance of the MaintenanceRequest 28008 entity there may be one ProjectWorkBreakdownStructureElementID 28018 attribute.

The IssueMaintenanceIssueCategoryCatalogueID 28024 attribute is a MaintenanceIssueCategoryCatalogueID 28028 datatype. The IssueMaintenanceIssueCategoryCatalogueID 28024 attribute has a cardinality of zero or one 28026 meaning that for each instance of the MaintenanceRequest 28008 entity there may be one IssueMaintenanceIssueCategoryCatalogueID 28024 attribute.

The IssueParentMaintenanceIssueCategoryID 28030 attribute is a MaintenanceIssueCategoryID 28034 datatype. The IssueParentMaintenanceIssueCategoryID 28030 attribute has a cardinality of zero or one 28032 meaning that for each instance of the MaintenanceRequest 28008 entity there may be one IssueParentMaintenanceIssueCategoryID 28030 attribute.

The IssueMaintenanceIssueCategoryID 28036 attribute is a MaintenanceIssueCategoryID 28040 datatype. The IssueMaintenanceIssueCategoryID 28036 attribute has a cardinality of zero or one 28038 meaning that for each instance of the MaintenanceRequest 28008 entity there may be one IssueMaintenanceIssueCategoryID 28036 attribute.

The MaterialInternalID 28042 attribute is a ProductInternalID 28046 datatype. The MaterialInternalID 28042 attribute has a cardinality of zero or one 28044 meaning that for each instance of the MaintenanceRequest 28008 entity there may be one MaterialInternalID 28042 attribute.

The InstallationPointID 28048 attribute is an InstallationPointID 28052 datatype. The InstallationPointID 28048 attribute has a cardinality of zero or one 28050 meaning that for each instance of the MaintenanceRequest 28008 entity there may be one InstallationPointID 28048 attribute.

The IndividualMaterialID 28054 attribute is a ProductInternalID 28058 datatype. The IndividualMaterialID 28054 attribute has a cardinality of zero or one 28056 meaning that for each instance of the MaintenanceRequest 28008 entity there may be one IndividualMaterialID 28054 attribute.

The SerialID 28060 attribute is a SerialID 28064 datatype. The SerialID 28060 attribute has a cardinality of zero or one 28062 meaning that for each instance of the MaintenanceRequest 28008 entity there may be one SerialID 28060 attribute.

The MaintenancePlantID 28066 attribute is a PlantID 28070 datatype. The MaintenancePlantID 28066 attribute has a cardinality of zero or one 28068 meaning that for each instance of the MaintenanceRequest 28008 entity there may be one MaintenancePlantID 28066 attribute.

The MaintenancePlanningPlantID 28072 attribute is a PlantID 28076 datatype. The MaintenancePlanningPlantID 28072 attribute has a cardinality of zero or one 28074 meaning that for each instance of the MaintenanceRequest 28008 entity there may be one MaintenancePlanningPlantID 28072 attribute.

The MaintenanceWorkCentreID 28078 attribute is a WorkCentreID 28082 datatype. The MaintenanceWorkCentreID 28078 attribute has a cardinality of zero or one 28080 meaning that for each instance of the MaintenanceRequest 28008 entity there may be one MaintenanceWorkCentreID 28078 attribute.

The MaintenanceWorkCentrePlantID 28084 attribute is a PlantID 28088 datatype. The MaintenanceWorkCentrePlantID 28084 attribute has a cardinality of zero or one 28086 meaning that for each instance of the MaintenanceRequest 28008 entity there may be one MaintenanceWorkCentrePlantID 28084 attribute.

The ReporterInternalID 28090 attribute is a PartyInternalID 28094 datatype. The ReporterInternalID 28090 attribute has a cardinality of zero or one 28092 meaning that for each instance of the MaintenanceRequest 28008 entity there may be one ReporterInternalID 28090 attribute.

The LocationInternalID 28096 attribute is a LocationInternalID 280100 datatype. The LocationInternalID 28096 attribute has a cardinality of zero or one 28098 meaning that for each instance of the MaintenanceRequest 28008 entity there may be one LocationInternalID 28096 attribute.

The AffectedInstallationPointID 280102 attribute is an InstallationPointID 280106 datatype. The AffectedInstallationPointID 280102 attribute has a cardinality of zero or one 280104 meaning that for each instance of the MaintenanceRequest 28008 entity there may be one AffectedInstallationPointID 280102 attribute.

The AffectedIndividualMaterialID 280108 attribute is a ProductInternalID 280112 datatype. The AffectedIndividualMaterialID 280108 attribute has a cardinality of zero or one 280110 meaning that for each instance of the MaintenanceRequest 28008 entity there may be one AffectedIndividualMaterialID 280108 attribute.

The ReportedDateTime 280114 attribute is a TIMEZONEINDEPENDENT_DateTime 280118 datatype. The ReportedDateTime 280114 attribute has a cardinality of zero or one 280116 meaning that for each instance of the MaintenanceRequest 28008 entity there may be one ReportedDateTime 280114 attribute.

The ImportanceCode 280120 attribute is an ImportanceCode 280124 datatype. The ImportanceCode 280120 attribute has a cardinality of zero or one 280122 meaning that for each instance of the MaintenanceRequest 28008 entity there may be one ImportanceCode 280120 attribute.

The ProductionPlannerGroupCode 280126 attribute is a ProductionPlannerGroupCode 280130 datatype. The ProductionPlannerGroupCode 280126 attribute has a cardinality of zero or one 280128 meaning that for each instance of the MaintenanceRequest 28008 entity there may be one ProductionPlannerGroupCode 280126 attribute.

The RequestedProcessingPeriod 280132 attribute is an UPPEROPEN_TIMEZONEINDEPENDENT_ DateTimePeriod 280136 datatype. The RequestedProcessingPeriod 280132 attribute has a cardinality of zero or one 280134 meaning that for each instance of the MaintenanceRequest 28008 entity there may be one RequestedProcessingPeriod 280132 attribute.

The MachineryBreakdownIndicator 280138 attribute is an Indicator 280142 datatype. The MachineryBreakdownIndicator 280138 attribute has a cardinality of zero or one 280140 meaning that for each instance of the MaintenanceRequest 28008 entity there may be one MachineryBreakdownIndicator 280138 attribute.

The MachineryMalfunctionPeriod 280144 attribute is an UPPEROPEN_TIMEZONEINDEPENDENT_ DateTimePeriod 280148 datatype. The MachineryMalfunctionPeriod 280144 attribute has a cardinality of zero or one 280146 meaning that for each instance of the MaintenanceRequest 28008 entity there may be one MachineryMalfunctionPeriod 280144 attribute.

The MachineryBreakdownDuration 280150 attribute is a Duration 280154 datatype. The MachineryBreakdownDuration 280150 attribute has a cardinality of zero or one 280152 meaning that for each instance of the MaintenanceRequest 28008 entity there may be one MachineryBreakdownDuration 280150 attribute.

The Description 280156 attribute is a SHORT_Description 280160 datatype. The Description 280156 attribute has a cardinality of zero or one 280158 meaning that for each instance of the MaintenanceRequest 28008 entity there may be one Description 280156 attribute.

The DetailedText 280162 attribute is a Text 280166 datatype. The DetailedText 280162 attribute has a cardinality of zero or one 280164 meaning that for each instance of the MaintenanceRequest 28008 entity there may be one DetailedText 280162 attribute.

The Item 280168 package includes an Item 280170 entity. The Item 280168 package includes various packages, namely Cause 280246, Task 280300 and Activity 280378.

The Item 280170 entity has a cardinality of zero or n 280172 meaning that for each instance of the MaintenanceRequest 28008 entity there may be one or more Item 280170 entities.

The Cause 280246 package includes a Cause 280248 entity.

The Cause 280248 entity includes various attributes, namely ID 280252, CauseMaintenanceIssueCategoryCatalogueID 280258, CauseParentMaintenanceIssueCategoryID 280264, CauseMaintenanceIssueCategoryID 280270, Description 280276, DetailedText 280282, OrdinalNumberValue 280288 and @actionCode 280294.

The ID 280252 attribute is a MaintenanceRequestCauseID 280256 datatype. The ID 280252 attribute has a cardinality of one 280254 meaning that for each instance of the Cause 280248 entity there is one ID 280252 attribute.

The CauseMaintenanceIssueCategoryCatalogueID 280258 attribute is a MaintenanceIssueCategoryCatalogueID 280262 datatype. The CauseMaintenanceIssueCategoryCatalogueID 280258 attribute has a cardinality of zero or one 280260 meaning that for each instance of the Cause 280248 entity there may be one CauseMaintenanceIssueCategoryCatalogueID 280258 attribute.

The CauseParentMaintenanceIssueCategoryID 280264 attribute is a MaintenanceIssueCategoryID 280268 datatype. The CauseParentMaintenanceIssueCategoryID 280264 attribute has a cardinality of zero or one 280266 meaning that for each instance of the Cause 280248 entity there may be one CauseParentMaintenanceIssueCategoryID 280264 attribute.

The CauseMaintenanceIssueCategoryID 280270 attribute is a MaintenanceIssueCategoryID 280274 datatype. The CauseMaintenanceIssueCategoryID 280270 attribute has a cardinality of zero or one 280272 meaning that for each instance of the Cause 280248 entity there may be one CauseMaintenanceIssueCategoryID 280270 attribute.

The Description 280276 attribute is a SHORT_Description 280280 datatype. The Description 280276 attribute has a cardinality of zero or one 280278 meaning that for each instance of the Cause 280248 entity there may be one Description 280276 attribute.

The DetailedText 280282 attribute is a Text 280286 datatype. The DetailedText 280282 attribute has a cardinality of zero or one 280284 meaning that for each instance of the Cause 280248 entity there may be one DetailedText 280282 attribute.

The OrdinalNumberValue 280288 attribute is an OrdinalNumberValue 280292 datatype. The OrdinalNumberValue 280288 attribute has a cardinality of one 280290 meaning that for each instance of the Cause 280248 entity there is one OrdinalNumberValue 280288 attribute.

The @actionCode 280294 attribute is an ActionCode 280298 datatype. The @actionCode 280294 attribute has a cardinality of one 280296 meaning that for each instance of the Cause 280248 entity there is one @actionCode 280294 attribute.

The Task 280300 package includes a Task 280302 entity.

The Task 280302 entity includes various attributes, namely ID 280306, EmployeeResponsibleInternalID 280312, CompleterInternalID 280318, TaskMaintenanceIssueCategoryCatalogueD 280324, TaskParentMaintenanceIssueCategoryID 280330, TaskMaintenanceIssueCategoryID 280336, EmployeeResponsibleInternalTypeCode 280342, PlannedProcessingPeriod 280348, Description 280354, DetailedText 280360, OrdinalNumberValue 280366 and @actionCode 280372.

The ID 280306 attribute is a MaintenanceRequestTaskID 280310 datatype. The ID 280306 attribute has a cardinality of one 280308 meaning that for each instance of the Task 280302 entity there is one ID 280306 attribute.

The EmployeeResponsibleInternalID 280312 attribute is a PartyInternalID 280316 datatype. The EmployeeResponsibleInternalID 280312 attribute has a cardinality of zero or one 280314 meaning that for each instance of the Task 280302 entity there may be one EmployeeResponsibleInternalID 280312 attribute.

The CompleterInternalID 280318 attribute is a PartyInternalID 280322 datatype. The CompleterInternalID 280318 attribute has a cardinality of zero or one 280320 meaning that for each instance of the Task 280302 entity there may be one CompleterInternalID 280318 attribute.

The TaskMaintenanceIssueCategoryCatalogueID 280324 attribute is a MaintenanceIssueCategoryCatalogueID 280328 datatype. The TaskMaintenanceIssueCategoryCatalogueID 280324 attribute has a cardinality of zero or one 280326 meaning that for each instance of the Task 280302 entity there may be one TaskMaintenanceIssueCategoryCatalogueID 280324 attribute.

The TaskParentMaintenanceIssueCategoryID 280330 attribute is a MaintenanceIssueCategoryID 280334 datatype. The TaskParentMaintenanceIssueCategoryID 280330 attribute has a cardinality of zero or one 280332 meaning that for each instance of the Task 280302 entity there may be one TaskParentMaintenanceIssueCategoryID 280330 attribute.

The TaskMaintenanceIssueCategoryID 280336 attribute is a MaintenanceIssueCategoryID 280340 datatype. The TaskMaintenanceIssueCategoryID 280336 attribute has a cardinality of zero or one 280338 meaning that for each instance of the Task 280302 entity there may be one TaskMaintenanceIssueCategoryID 280336 attribute.

The EmployeeResponsibleInternalTypeCode 280342 attribute is a BusinessObjectTypeCode 280346 datatype. The EmployeeResponsibleInternalTypeCode 280342 attribute has a cardinality of zero or one 280344 meaning that for each instance of the Task 280302 entity there may be one EmployeeResponsibleInternalTypeCode 280342 attribute.

The PlannedProcessingPeriod 280348 attribute is an UPPEROPEN_TIMEZONEINDEPENDENT_ DateTimePeriod 280352 datatype. The PlannedProcessingPeriod 280348 attribute has a cardinality of zero or one 280350 meaning that for each instance of the Task 280302 entity there may be one PlannedProcessingPeriod 280348 attribute.

The Description 280354 attribute is a SHORT_Description 280358 datatype. The Description 280354 attribute has a cardinality of zero or one 280356 meaning that for each instance of the Task 280302 entity there may be one Description 280354 attribute.

The DetailedText 280360 attribute is a Text 280364 datatype. The DetailedText 280360 attribute has a cardinality of zero or one 280362 meaning that for each instance of the Task 280302 entity there may be one DetailedText 280360 attribute.

The OrdinalNumberValue 280366 attribute is an OrdinalNumberValue 280370 datatype. The OrdinalNumberValue 280366 attribute has a cardinality of one 280368 meaning that for each instance of the Task 280302 entity there is one OrdinalNumberValue 280366 attribute.

The @actionCode 280372 attribute is an ActionCode 280376 datatype. The @actionCode 280372 attribute has a cardinality of one 280374 meaning that for each instance of the Task 280302 entity there is one @actionCode 280372 attribute.

The Activity 280378 package includes an Activity 280380 entity.

The Activity 280380 entity includes various attributes, namely ID 280384, ActivityMaintenanceIssueCategoryCatalogueID 280390, ActivityParentMaintenanceIssueCategoryID 280396, ActivityMaintenanceIssueCategoryID 280402, ProcessingPeriod 280408, Description 280414, DetailedText 280420, OrdinalNumberValue 280426 and @actionCode 280432.

The ID 280384 attribute is a MaintenanceRequestActivityID 280388 datatype. The ID 280384 attribute has a cardinality of one 280386 meaning that for each instance of the Activity 280380 entity there is one ID 280384 attribute.

The ActivityMaintenanceIssueCategoryCatalogueID 280390 attribute is a MaintenanceIssueCategoryCatalogueID 280394 datatype. The ActivityMaintenanceIssueCategoryCatalogueID 280390 attribute has a cardinality of zero or one 280392 meaning that for each instance of the Activity 280380 entity there may be one ActivityMaintenanceIssueCategoryCatalogueID 280390 attribute.

The ActivityParentMaintenanceIssueCategoryID 280396 attribute is a MaintenanceIssueCategoryID 280400 datatype. The ActivityParentMaintenanceIssueCategoryID 280396 attribute has a cardinality of zero or one 280398 meaning that for each instance of the Activity 280380 entity there may be one ActivityParentMaintenanceIssueCategoryID 280396 attribute.

The ActivityMaintenanceIssueCategoryID 280402 attribute is a MaintenanceIssueCategoryID 280406 datatype. The ActivityMaintenanceIssueCategoryID 280402 attribute has a cardinality of zero or one 280404 meaning that for each instance of the Activity 280380 entity there may be one ActivityMaintenanceIssueCategoryID 280402 attribute.

The ProcessingPeriod 280408 attribute is an UPPEROPEN_TIMEZONEINDEPENDENT_DateTimePeriod 280412 datatype. The ProcessingPeriod 280408 attribute has a cardinality of zero or one 280410 meaning that for each instance of the Activity 280380 entity there may be one ProcessingPeriod 280408 attribute.

The Description 280414 attribute is a SHORT_Description 280418 datatype. The Description 280414 attribute has a cardinality of zero or one 280416 meaning that for each instance of the Activity 280380 entity there may be one Description 280414 attribute.

The DetailedText 280420 attribute is a Text 280424 datatype. The DetailedText 280420 attribute has a cardinality of zero or one 280422 meaning that for each instance of the Activity 280380 entity there may be one DetailedText 280420 attribute.

The OrdinalNumberValue 280426 attribute is an OrdinalNumberValue 280430 datatype. The OrdinalNumberValue 280426 attribute has a cardinality of one 280428 meaning that for each instance of the Activity 280380 entity there is one OrdinalNumberValue 280426 attribute.

The @actionCode 280432 attribute is an ActionCode 280436 datatype. The @actionCode 280432 attribute has a cardinality of one 280434 meaning that for each instance of the Activity 280380 entity there is one @actionCode 280432 attribute.

The Task 280438 package includes a Task 280440 entity.

The Task 280440 entity has a cardinality of zero or n 280442 meaning that for each instance of the MaintenanceRequest 28008 entity there may be one or more Task 280440 entities.

The Activity 280514 package includes an Activity 280516 entity.

The Activity 280516 entity has a cardinality of zero or n 280518 meaning that for each instance of the MaintenanceRequest 28008 entity there may be one or more Activity 280516 entities.

MaintenanceRequest Package

The MaintenanceRequest package groups the MaintenanceRequest with its entities.

MaintenanceRequest

A MaintenanceRequest is a request for maintenance of a product or an installation point. Maintenance requests document maintenance tasks completely, and make them available for analysis in the long term. It also helps in preliminary planning and execution of tasks.

ID refers to an identifier for a maintenance request. ProjectWorkBreakdownStructureElementID (may be optional) refers to an identifier for a Project Work Breakdown Structure Element. A Project Work Breakdown Structure (WBS) organizes the different tasks involved in the project in a hierarchical structure. The WBS consists of a number of WBS elements. A WBS element represents a certain task or a partial task that can be subdivided further. IssueMaintenanceIssueCategoryCatalogueID (may be optional) refers to an identifier for a catalogue of categories for maintenance-related issues of type Issue. IssueParentMaintenanceIssueCategoryID (may be optional) may be directly superordinate to a particular category, it is an identifier for a category of a maintenance-related issue of type Issue. IssueMaintenanceIssueCategoryID (may be optional) refers to an identifier for a category of a maintenance-related issue of type Subject. MaterialInternalID (may be optional) refers to a proprietary identifier for a material. This is the identifier of a material for which maintenance request is being created. InstallationPointID (may be optional) refers to a unique identifier for an installation point. It is the identifier of an installation point for which maintenance request is being created. IndividualMaterialID (may be optional) refers to a proprietary identifier for an individual material. It is the identifier of an individual material for which maintenance request is being created. SerialID (may be optional) refers to a unique identifier for an individual material that is assigned in the maintenance request. MaintenancePlantID (may be optional) refers to an identifier of a plant in which the product and installation point of a company are installed and maintained. MaintenancePlanningPlantID (may be optional) refers to an identifier of a plant in which the planning and the supervision of the execution of maintenance work is done. MaintenanceWorkCentreID (may be optional) refers to an identifier of a WorkCentre where the execution of maintenance work is done. MaintenanceWorkCentrePlantID (may be optional) refers to an identifier of a Plant where the work centre which is responsible for the execution of maintenance work is present. ReporterInternalID (may be optional) refers to a proprietary identifier for a party which reports a maintenance request. LocationInternalID (may be optional) refers to a proprietary identifier for a location of the product or installation point that has to be maintained within a maintenance plant. AffectedInstallationPointID (may be optional) refers to a unique identifier of an installation point which has a side effect by the maintenance request. AffectedIndividualMaterialID (may be optional) refers to a proprietary identifier of an individual material which has a side effect by the maintenance request. ImportanceCode (may be optional) refers to the coded representation of the importance of maintenance request. ProductionPlannerGroupCode (may be optional) refers to the coded representation of a MaintenancePlannerGroup. RequestedProcessingPeriod (may be optional) refers to a period during which processing of the maintenance request is requested. MachineryBreakdownIndicator (may be optional) refers to the representation of machinery in the state of breakdown. It indicates whether the machinery is in the state of breakdown or not. MachineryMalfunctionPeriod (may be optional) refers to a Period is a period during which machinery has or had malfunctions. MachineryBreakdownDuration (may be optional) refers to a period of time of a particular length without a fixed start or end time, during which a machinery is in the state breakdown. MachineryBreakdownDuration can be entered when the MachineryBreakdownIndicator is set to true. Description (may be optional) refers to the properties of a maintenance request in natural language. DetailedText (may be optional) refers to a language-dependent specification for a maintenance request. A MaintenanceIssueCategoryID can be unique in combination with a ParentMaintenanceIssueCategoryID and MaintenanceIssueCategoryCatalogueID.

Item Package

An Item package groups together all the relevant information in terms of an item.

Item

An item is an individual problem or exceptional situation that has occurred with a product or an installation point. ID refers to an identifier for a maintenance request item. MaterialInternalID (may be optional) refers to a proprietary identifier for a material in a maintenance request item. DamageMaintenanceIssueCategoryCatalogueID (may be optional) refers to an identifier for a catalogue of categories for maintenance-related issues of type Damage. DamageParentMaintenanceIssueCategoryID (may be optional) may be directly superordinate to a particular category, it is an identifier for a category of a maintenance-related issue of type Subject. DamageMaintenanceIssueCategoryID (may be optional) refers to an identifier for a category of a maintenance-related issue of type Damage. ObjectPartMaintenanceIssueCategoryCatalogueID (may be optional) refers to an identifier for a catalogue of categories for maintenance-related issues of type ObjectPart. ObjectPartParentMaintenanceIssueCategoryID (may be optional) may be directly superordinate to a particular category, it is an identifier for a category of a maintenance-related issue of type ObjectPart. ObjectPartMaintenanceIssueCategoryID (may be optional) refers to an identifier for a category of a maintenance-related issue of type ObjectPart. Description (may be optional) refers to a representation of the properties of a maintenance request item in natural language. DetailedText (may be optional) refers to a language-dependent specification for a maintenance request item. OrdinalNumberValue refers to a number that indicates the position of a maintenance request item in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID. A maintenance request refers to an item but it is possible to create a maintenance request without one. It is possible to attach more than one task, activity and cause per item.

Cause

A Cause is a cause that led to the occurrence of the malfunction or exceptional situation in a product or an installation point. ID refers to an identifier for a maintenance request cause. CauseMaintenanceIssueCategoryCatalogueID (may be optional) refers to an identifier for a catalogue of categories for maintenance-related issues of type Cause. CauseParentMaintenanceIssueCategoryID (may be optional) may be directly superordinate to a particular category, it is an identifier for a category of a maintenance-related issue of type Cause. CauseMaintenanceIssueCategoryID (may be optional) refers to an identifier for a category of a maintenance-related issue of type Cause. Description (may be optional) refers to a representation of the properties of a maintenance request item cause in natural language. DetailedText (may be optional) refers to a language-dependent specification for a maintenance request item cause. OrdinalNumberValue refers to a number that indicates the position of a maintenance request item cause in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID.

Task

A Task is a long-term action required to rectify the malfunction or exceptional situation in a product or an installation point. ID identifies a task. EmployeeResponsibleInternalID (may be optional) refers to a proprietary identifier for an EmployeeResponsible who is responsible for processing a task. CompletorInternalID (may be optional) refers to the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as the key for the task to be performed and a brief instruction describing what is to be done, the planned start and end dates for the task, and the task status.

Activity

An Activity is a short-term action that shall be executed immediately to rectify the malfunction or exceptional situation in a product or an installation point.

ID refers to an identifier for an activity. ActivityMaintenanceIssueCategoryCatalogueID (may be optional) refers to an identifier of a maintenance issue category catalogue of type Activity. ActivityParentMaintenanceIssueCategoryID (may be optional) refers to an identifier of a parent category of type Activity. ActivityMaintenanceIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValid refers to an identifier of the position of an activity in a sorted list. @actionCode defines the action to be performed. A MaintenanceIssueCategoryID can be unique in combination with a ParentMaintenanceIssueCategoryID and MaintenanceIssueCategoryCatalogueID.

Task Package

A Task package groups together all the relevant information in terms of a task.

Task

A Task is a long-term action required to rectify the malfunction or exceptional situation in a product or an installation point. ID identifies a task. EmployeeResponsibleInternalID (may be optional) refers to a proprietary identifier for a EmployeeResponsible who is responsible for processing a task. CompletorInternalID (may be optional) refers to the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors. @actionCode defines the action to be performed. A MaintenanceIssueCategoryID can be unique in combination with a ParentMaintenanceIssueCategoryID and MaintenanceIssueCategoryCatalogueID. Using a task, one can plan how different people can interact to process a request and track how various activities are completed within a specified period of time. Several details for each task can be entered such as the key for the task to be performed and a brief instruction describing what is to be done, the planned start and end dates for the task, and task status.

Activity Package

An Activity package groups together all the relevant information in terms of a activity.

Activity

An Activity is a short-term action that shall be executed immediately to rectify the malfunction or exceptional situation in a product or an installation point. ID refers to an identifier for an activity. ActivityMaintenanceIssueCategoryCatalogueID (may be optional) refers to a maintenance issue category catalogue of type Activity. ActivityParentMaintenanceIssueCategoryID (may be optional) refers to a parent category of type Activity. ActivityMaintenanceIssueCategoryID (may be optional) refers to a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue refers to the position of an activity in a sorted list. @actionCode defines the action to be performed. A MaintenanceIssueCategoryID can be unique in combination with a ParentMaintenanceIssueCategoryID and MaintenanceIssueCategoryCatalogueID.

Party Package

A Party package groups together all the relevant information in terms of a party.

VendorParty

A VendorParty is a party that delivers goods or provides services. InternalID (may be optional) refers to an identifier for a party.

ManufacturerParty

A ManufacturerParty is a party that manufactures goods. InternalID (may be optional) refers to an identifier for a party.

Party

A Party is a natural person, organization, or business partner group that is involved in a MaintenanceRequest. This could be a person, organization or group inside or outside of the company. InternalID (may be optional) refers to an identifier for a party. RoleCode (may be optional) refers to a coded representation of a PartyRole.

Message Data Type

FIG. 281 shows a MaintenanceRequestChangeCheckResponseMessage_sync 28100 package. The MaintenanceRequestChangeCheckResponseMessage_sync 28100 package is a MaintenanceRequestChangeCheckResponseMessage_sync 28104 datatype. The MaintenanceRequestChangeCheckResponseMessage_sync 28100 package includes a MaintenanceRequestChangeCheckResponseMessage_sync 28102 entity. The MaintenanceRequestChangeCheckResponseMessage_sync 28100 package includes a Log 28106 package.

The Log 28106 package is a Log 28112 datatype. The Log 28106 package includes a Log 28108 entity.

The Log 28108 entity has a cardinality of one 28110 meaning that for each instance of the MaintenanceRequestChangeCheckResponseMessage_sync 28102 entity there is one Log 28108 entity.

Log Package

A Log package groups the error messages used for user interaction

Log

A Log is a sequence of messages that result when an application executes a task.

Message Data Type

FIG. 278 shows a MaintenanceRequestByIDQueryMessage_sync 27800 package. The MaintenanceRequestByIDQueryMessage_sync 27800 package is a MaintenanceRequestByIDQueryMessage_sync 27804 datatype. The MaintenanceRequestByIDQueryMessage_sync 27800 package includes a MaintenanceRequestByIDQueryMessage_sync 27802 entity. The MaintenanceRequestByIDQueryMessage_sync 27800 package includes a Selection 27806 package.

The Selection 27806 package includes a MaintenanceRequestSelectionByID 27808 entity.

The MaintenanceRequestSelectionByID 27808 entity has a cardinality of one 27810 meaning that for each instance of the MaintenanceRequestByIDQueryMessage_sync 27802 entity there is one MaintenanceRequestSelectionByID 27808 entity. The MaintenanceRequestSelectionByID 27808 entity includes an ID 27812 attribute.

The ID 27812 attribute is a MaintenanceRequestID 27816 datatype. The ID 27812 attribute has a cardinality of one 27814 meaning that for each instance of the MaintenanceRequestSelectionByID 27808 entity there is one ID 27812 attribute.

Selection Package

The Selection package collects all the selection criteria for Maintenance Request.

MaintenanceRequestSelectionByID

MaintenanceRequestSelectionByID specifies selection criteria to select a MaintenanceRequest by MaintenanceRequestID. MaintenanceRequestID refers to an identifier for a maintenance request.

Message Data Type

FIGS. 279-1 through 279-28 show a MaintenanceRequestByIDResponseMessage_sync 27900 package. The MaintenanceRequestByIDResponseMessage_sync 27900 package is a MaintenanceRequestByIDResponseMessage_sync 27904 datatype. The MaintenanceRequestByIDResponseMessage_sync 27900 package includes a MaintenanceRequestByIDResponseMessage_sync 27902 entity. The MaintenanceRequestByIDResponseMessage_sync 27900 package includes a MaintenanceRequest 27906 package.

The MaintenanceRequest 27906 package includes a MaintenanceRequest 27908 entity. The MaintenanceRequest 27906 package includes various packages, namely Item 279270, Task 279628 and Activity 279740.

The MaintenanceRequest 27908 entity has a cardinality of one 27910 meaning that for each instance of the MaintenanceRequestByIDResponseMessage_sync 27902 entity there is one MaintenanceRequest 27908 entity. The MaintenanceRequest 27908 entity includes various attributes, namely ID 27912, ProjectWorkBreakdownStructureElementID 27918, IssueMaintenanceIssueCategoryCatalogueID 27924, IssueParentMaintenanceIssueCategoryID 27930, IssueMaintenanceIssueCategoryID 27936, IssueCategoryFilterCode 27942, MaterialInternalID 27948, InstallationPointID 27954, IndividualMaterialID 27960, SerialID 27966, MaintenancePlantID 27972, MaintenancePlanningPlantID 27978, MaintenanceWorkCentreID 27984, MaintenanceWorkCentrePlantID 27990, ReporterInternalID 27996, LocationInternalID 279102, AffectedInstallationPointID 279108, AffectedIndividualMaterialID 279114, SystemAdministrativeData 279120, ReportedDateTime 279126, TypeCode 279132, ImportanceCode 279138, ProductionPlannerGroupCode 279144, StatusObject 279150, ParentIssueMaintenanceIssueCategoryName 279156, IssueMaintenanceIssueCategoryName 279162, MaterialInternalDescription 279168, InstallationPointDescription 279174, IndividualMaterialDescription 279180, MaintenancePlantDescription 279186, MaintenancePlanningPlantDescription 279192, MaintenanceWorkCentreDescription 279198, RequestedProcessingPeriod 279204, MachineryBreakdownIndicator 279210, MachineryMalfunctionPeriod 279216, MachineryBreakdownDuration 279222, LocationDescription 279228, TypeName 279234, ImportanceName 279240, Description 279246, DetailedText 279252, AffectedInstallationPointDescription 279258 and AffectedIndividualMaterialDescription 279264.

The ID 27912 attribute is a MaintenanceRequestID 27916 datatype. The ID 27912 attribute has a cardinality of one 27914 meaning that for each instance of the MaintenanceRequest 27908 entity there is one ID 27912 attribute.

The ProjectWorkBreakdownStructureElementID 27918 attribute is a ProjectWorkBreakdownStructureElementID 27922 datatype. The ProjectWorkBreakdownStructureElementID 27918 attribute has a cardinality of zero or one 27920 meaning that for each instance of the MaintenanceRequest 27908 entity there may be one ProjectWorkBreakdownStructureElementID 27918 attribute.

The IssueMaintenanceIssueCategoryCatalogueID 27924 attribute is a MaintenanceIssueCategoryCatalogueID 27928 datatype. The IssueMaintenanceIssueCategoryCatalogueID 27924 attribute has a cardinality of zero or one 27926 meaning that for each instance of the MaintenanceRequest 27908 entity there may be one IssueMaintenanceIssueCategoryCatalogueID 27924 attribute.

The IssueParentMaintenanceIssueCategoryID 27930 attribute is a MaintenanceIssueCategoryID 27934 datatype. The IssueParentMaintenanceIssueCategoryID 27930 attribute has a cardinality of zero or one 27932 meaning that for each instance of the MaintenanceRequest 27908 entity there may be one IssueParentMaintenanceIssueCategoryID 27930 attribute.

The IssueMaintenanceIssueCategoryID 27936 attribute is a MaintenanceIssueCategoryID 27940 datatype. The IssueMaintenanceIssueCategoryID 27936 attribute has a cardinality of zero or one 27938 meaning that for each instance of the MaintenanceRequest 27908 entity there may be one IssueMaintenanceIssueCategoryID 27936 attribute.

The IssueCategoryFilterCode 27942 attribute is an IssueCategoryFilterCode 27946 datatype. The IssueCategoryFilterCode 27942 attribute has a cardinality of zero or one 27944 meaning that for each instance of the MaintenanceRequest 27908 entity there may be one IssueCategoryFilterCode 27942 attribute.

The MaterialInternalID 27948 attribute is a ProductInternalID 27952 datatype. The MaterialInternalID 27948 attribute has a cardinality of zero or one 27950 meaning that for each instance of the MaintenanceRequest 27908 entity there may be one MaterialInternalID 27948 attribute.

The InstallationPointID 27954 attribute is an InstallationPointID 27958 datatype. The InstallationPointID 27954 attribute has a cardinality of zero or one 27956 meaning that for each instance of the MaintenanceRequest 27908 entity there may be one InstallationPointID 27954 attribute.

The IndividualMaterialID 27960 attribute is a ProductInternalID 27964 datatype. The IndividualMaterialID 27960 attribute has a cardinality of zero or one 27962 meaning that for each instance of the MaintenanceRequest 27908 entity there may be one IndividualMaterialID 27960 attribute.

The SerialID 27966 attribute is a SerialID 27970 datatype. The SerialID 27966 attribute has a cardinality of zero or one 27968 meaning that for each instance of the MaintenanceRequest 27908 entity there may be one SerialID 27966 attribute.

The MaintenancePlantID 27972 attribute is a PlantID 27976 datatype. The MaintenancePlantID 27972 attribute has a cardinality of zero or one 27974 meaning that for each instance of the MaintenanceRequest 27908 entity there may be one MaintenancePlantID 27972 attribute.

The MaintenancePlanningPlantID 27978 attribute is a PlantID 27982 datatype. The MaintenancePlanningPlantID 27978 attribute has a cardinality of zero or one 27980 meaning that for each instance of the MaintenanceRequest 27908 entity there may be one MaintenancePlanningPlantID 27978 attribute.

The MaintenanceWorkCentreID 27984 attribute is a WorkCentreID 27988 datatype. The MaintenanceWorkCentreID 27984 attribute has a cardinality of zero or one 27986 meaning that for each instance of the MaintenanceRequest 27908 entity there may be one MaintenanceWorkCentreID 27984 attribute.

The MaintenanceWorkCentrePlantID 27990 attribute is a PlantID 27994 datatype. The MaintenanceWorkCentrePlantID 27990 attribute has a cardinality of zero or one 27992 meaning that for each instance of the MaintenanceRequest 27908 entity there may be one MaintenanceWorkCentrePlantID 27990 attribute.

The ReporterInternalID 27996 attribute is a PartyInternalID 279100 datatype. The ReporterInternalID 27996 attribute has a cardinality of zero or one 27998 meaning that for each instance of the MaintenanceRequest 27908 entity there may be one ReporterInternalID 27996 attribute.

The LocationInternalID 279102 attribute is a LocationInternalID 279106 datatype. The LocationInternalID 279102 attribute has a cardinality of zero or one 279104 meaning that for each instance of the MaintenanceRequest 27908 entity there may be one LocationInternalID 279102 attribute.

The AffectedInstallationPointID 279108 attribute is an InstallationPointID 279112 datatype. The AffectedInstallationPointID 279108 attribute has a cardinality of zero or one 279110 meaning that for each instance of the MaintenanceRequest 27908 entity there may be one AffectedInstallationPointID 279108 attribute.

The AffectedIndividualMaterialID 279114 attribute is a ProductInternalID 279118 datatype. The AffectedIndividualMaterialID 279114 attribute has a cardinality of zero or one 279116 meaning that for each instance of the MaintenanceRequest 27908 entity there may be one AffectedIndividualMaterialID 279114 attribute.

The SystemAdministrativeData 279120 attribute is a SystemAdministrativeData 279124 datatype. The SystemAdministrativeData 279120 attribute has a cardinality of one 279122 meaning that for each instance of the MaintenanceRequest 27908 entity there is one SystemAdministrativeData 279120 attribute.

The ReportedDateTime 279126 attribute is a TIMEZONEINDEPENDENT_DateTime 279130 datatype. The ReportedDateTime 279126 attribute has a cardinality of zero or one 279128 meaning that for each instance of the MaintenanceRequest 27908 entity there may be one ReportedDateTime 279126 attribute.

The TypeCode 279132 attribute is a MaintenanceRequestTypeCode 279136 datatype. The TypeCode 279132 attribute has a cardinality of one 279134 meaning that for each instance of the MaintenanceRequest 27908 entity there is one TypeCode 279132 attribute.

The ImportanceCode 279138 attribute is an ImportanceCode 279142 datatype. The ImportanceCode 279138 attribute has a cardinality of zero or one 279140 meaning that for each instance of the MaintenanceRequest 27908 entity there may be one ImportanceCode 279138 attribute.

The ProductionPlannerGroupCode 279144 attribute is a ProductionPlannerGroupCode 279148 datatype. The ProductionPlannerGroupCode 279144 attribute has a cardinality of zero or one 279146 meaning that for each instance of the MaintenanceRequest 27908 entity there may be one ProductionPlannerGroupCode 279144 attribute.

The StatusObject 279150 attribute is a StatusObject 279154 datatype. The StatusObject 279150 attribute has a cardinality of one 279152 meaning that for each instance of the MaintenanceRequest 27908 entity there is one StatusObject 279150 attribute.

The ParentIssueMaintenanceIssueCategoryName 279156 attribute is a MEDIUM_Name 279160 datatype. The ParentIssueMaintenanceIssueCategoryName 279156 attribute has a cardinality of zero or one 279158 meaning that for each instance of the MaintenanceRequest 27908 entity there may be one ParentIssueMaintenanceIssueCategoryName 279156 attribute.

The IssueMaintenanceIssueCategoryName 279162 attribute is a MEDIUM_Name 279166 datatype. The IssueMaintenanceIssueCategoryName 279162 attribute has a cardinality of zero or one 279164 meaning that for each instance of the MaintenanceRequest 27908 entity there may be one IssueMaintenanceIssueCategoryName 279162 attribute.

The MaterialInternalDescription 279168 attribute is a SHORT_Description 279172 datatype. The MaterialInternalDescription 279168 attribute has a cardinality of zero or one 279170 meaning that for each instance of the MaintenanceRequest 27908 entity there may be one MaterialInternalDescription 279168 attribute.

The InstallationPointDescription 279174 attribute is a SHORT_Description 279178 datatype. The InstallationPointDescription 279174 attribute has a cardinality of zero or one 279176 meaning that for each instance of the MaintenanceRequest 27908 entity there may be one InstallationPointDescription 279174 attribute.

The IndividualMaterialDescription 279180 attribute is a SHORT_Description 279184 datatype. The IndividualMaterialDescription 279180 attribute has a cardinality of zero or one 279182 meaning that for each instance of the MaintenanceRequest 27908 entity there may be one IndividualMaterialDescription 279180 attribute.

The MaintenancePlantDescription 279186 attribute is a SHORT_Description 279190 datatype. The MaintenancePlantDescription 279186 attribute has a cardinality of zero or one 279188 meaning that for each instance of the MaintenanceRequest 27908 entity there may be one MaintenancePlantDescription 279186 attribute.

The MaintenancePlanningPlantDescription 279192 attribute is a SHORT_Description 279196 datatype. The MaintenancePlanningPlantDescription 279192 attribute has a cardinality of zero or one 279194 meaning that for each instance of the MaintenanceRequest 27908 entity there may be one MaintenancePlanningPlantDescription 279192 attribute.

The MaintenanceWorkCentreDescription 279198 attribute is a SHORT_Description 279202 datatype. The MaintenanceWorkCentreDescription 279198 attribute has a cardinality of zero or one 279200 meaning that for each instance of the MaintenanceRequest 27908 entity there may be one MaintenanceWorkCentreDescription 279198 attribute.

The RequestedProcessingPeriod 279204 attribute is an UPPEROPEN_TIMEZONEINDEPENDENT_ DateTimePeriod 279208 datatype. The RequestedProcessingPeriod 279204 attribute has a cardinality of zero or one 279206 meaning that for each instance of the MaintenanceRequest 27908 entity there may be one RequestedProcessingPeriod 279204 attribute.

The MachineryBreakdownIndicator 279210 attribute is an Indicator 279214 datatype. The MachineryBreakdownIndicator 279210 attribute has a cardinality of zero or one 279212 meaning that for each instance of the MaintenanceRequest 27908 entity there may be one MachineryBreakdownIndicator 279210 attribute.

The MachineryMalfunctionPeriod 279216 attribute is an UPPEROPEN_TIMEZONEINDEPENDENT_ DateTimePeriod 279220 datatype. The MachineryMalfunctionPeriod 279216 attribute has a cardinality of zero or one 279218 meaning that for each instance of the MaintenanceRequest 27908 entity there may be one MachineryMalfunctionPeriod 279216 attribute.

The MachineryBreakdownDuration 279222 attribute is a Duration 279226 datatype. The MachineryBreakdownDuration 279222 attribute has a cardinality of zero or one 279224 meaning that for each instance of the MaintenanceRequest 27908 entity there may be one MachineryBreakdownDuration 279222 attribute.

The LocationDescription 279228 attribute is a SHORT_ Description 279232 datatype. The LocationDescription 279228 attribute has a cardinality of zero or one 279230 meaning that for each instance of the MaintenanceRequest 27908 entity there may be one LocationDescription 279228 attribute.

The TypeName 279234 attribute is a LEN20_Name 279238 datatype. The TypeName 279234 attribute has a cardinality of zero or one 279236 meaning that for each instance of the MaintenanceRequest 27908 entity there may be one TypeName 279234 attribute.

The ImportanceName 279240 attribute is a LEN20_Name 279244 datatype. The ImportanceName 279240 attribute has a cardinality of zero or one 279242 meaning that for each instance of the MaintenanceRequest 27908 entity there may be one ImportanceName 279240 attribute.

The Description 279246 attribute is a SHORT_Description 279250 datatype. The Description 279246 attribute has a cardinality of zero or one 279248 meaning that for each instance of the MaintenanceRequest 27908 entity there may be one Description 279246 attribute.

The DetailedText 279252 attribute is a Text 279256 datatype. The DetailedText 279252 attribute has a cardinality of zero or one 279254 meaning that for each instance of the MaintenanceRequest 27908 entity there may be one DetailedText 279252 attribute.

The AffectedInstallationPointDescription 279258 attribute is a SHORT_Description 279262 datatype. The AffectedInstallationPointDescription 279258 attribute has a cardinality of zero or one 279260 meaning that for each instance of the MaintenanceRequest 27908 entity there may be one AffectedInstallationPointDescription 279258 attribute.

The AffectedIndividualMaterialDescription 279264 attribute is a SHORT_Description 279268 datatype. The AffectedIndividualMaterialDescription 279264 attribute has a cardinality of zero or one 279266 meaning that for each instance of the MaintenanceRequest 27908 entity there may be one AffectedIndividualMaterialDescription 279264 attribute.

The Item 279270 package includes an Item 279272 entity. The Item 279270 package includes various packages, namely Cause 279378, Task 279444 and Activity 279556.

The Item 279272 entity has a cardinality of zero or n 279274 meaning that for each instance of the MaintenanceRequest 27908 entity there may be one or more Item 279272 entities. The Item 279272 entity includes various attributes, namely ID 279276, MaterialInternalID 279282, DamageMaintenanceIssueCategoryCatalogueID 279288, DamageParentMaintenanceIssueCategoryID 279294, DamageMaintenanceIssueCategoryID 279300, ObjectPartMaintenanceIssueCategoryCatalogueID 279306, ObjectPartParentMaintenanceIssueCategoryID 279312, ObjectPartMaintenanceIssueCategoryID 279318, SystemAdministrativeData 279324, MaterialDescription 279330, DamageMaintenanceIssueCategoryName 279336, ParentDamageMaintenanceIssueCategoryName 279342, ObjectPartMaintenanceIssueCategoryName 279348, ParentObjectPartMaintenanceIssueCategoryName 279354, Description 279360, DetailedText 279366 and OrdinalNumberValue 279372.

The ID 279276 attribute is a MaintenanceRequestItemID 279280 datatype. The ID 279276 attribute has a cardinality of one 279278 meaning that for each instance of the Item 279272 entity there is one ID 279276 attribute.

The MaterialInternalID 279282 attribute is a ProductInternalID 279286 datatype. The MaterialInternalID 279282 attribute has a cardinality of zero or one 279284 meaning that for each instance of the Item 279272 entity there may be one MaterialInternalID 279282 attribute.

The DamageMaintenanceIssueCategoryCatalogueID 279288 attribute is a MaintenanceIssueCategoryCatalogueID 279292 datatype. The DamageMaintenanceIssueCategoryCatalogueID 279288 attribute has a cardinality of zero or one 279290 meaning that for each instance of the Item 279272 entity there may be one DamageMaintenanceIssueCategoryCatalogueID 279288 attribute.

The DamageParentMaintenanceIssueCategoryID 279294 attribute is a MaintenanceIssueCategoryID 279298 datatype. The DamageParentMaintenanceIssueCategoryID 279294 attribute has a cardinality of zero or one 279296 meaning that for each instance of the Item 279272 entity there may be one DamageParentMaintenanceIssueCategoryID 279294 attribute.

The DamageMaintenanceIssueCategoryID 279300 attribute is a MaintenanceIssueCategoryID 279304 datatype. The DamageMaintenanceIssueCategoryID 279300 attribute has a cardinality of zero or one 279302 meaning that for each instance of the Item 279272 entity there may be one DamageMaintenanceIssueCategoryID 279300 attribute.

The ObjectPartMaintenanceIssueCategoryCatalogueID 279306 attribute is a MaintenanceIssueCategoryCatalogueID 279310 datatype. The ObjectPartMaintenanceIssueCategoryCatalogueID 279306 attribute has a cardinality of zero or one 279308 meaning that for each instance of the Item 279272 entity there may be one ObjectPartMaintenanceIssueCategoryCatalogueID 279306 attribute.

The ObjectPartParentMaintenanceIssueCategoryID 279312 attribute is a MaintenanceIssueCategoryID 279316 datatype. The ObjectPartParentMaintenanceIssueCategoryID 279312 attribute has a cardinality of zero or one 279314 meaning that for each instance of the Item 279272 entity there may be one ObjectPartParentMaintenanceIssueCategoryID 279312 attribute.

The ObjectPartMaintenanceIssueCategoryID 279318 attribute is a MaintenanceIssueCategoryID 279322 datatype. The ObjectPartMaintenanceIssueCategoryID 279318 attribute has a cardinality of zero or one 279320 meaning that for each instance of the Item 279272 entity there may be one ObjectPartMaintenanceIssueCategoryID 279318 attribute.

The SystemAdministrativeData 279324 attribute is a SystemAdministrativeData 279328 datatype. The SystemAdministrativeData 279324 attribute has a cardinality of one 279326 meaning that for each instance of the Item 279272 entity there is one SystemAdministrativeData 279324 attribute.

The MaterialDescription 279330 attribute is a SHORT_Description 279334 datatype. The MaterialDescription 279330 attribute has a cardinality of zero or one 279332 meaning that for each instance of the Item 279272 entity there may be one MaterialDescription 279330 attribute.

The DamageMaintenanceIssueCategoryName 279336 attribute is a MEDIUM_Name 279340 datatype. The DamageMaintenanceIssueCategoryName 279336 attribute has a cardinality of zero or one 279338 meaning that for each instance of the Item 279272 entity there may be one DamageMaintenanceIssueCategoryName 279336 attribute.

The ParentDamageMaintenanceIssueCategoryName 279342 attribute is a MEDIUM_Name 279346 datatype. The ParentDamageMaintenanceIssueCategoryName 279342 attribute has a cardinality of zero or one 279344 meaning that for each instance of the Item 279272 entity there may be one ParentDamageMaintenanceIssueCategoryName 279342 attribute.

The ObjectPartMaintenanceIssueCategoryName 279348 attribute is a MEDIUM_Name 279352 datatype. The ObjectPartMaintenanceIssueCategoryName 279348 attribute has a cardinality of zero or one 279350 meaning that for each instance of the Item 279272 entity there may be one ObjectPartMaintenanceIssueCategoryName 279348 attribute.

The ParentObjectPartMaintenanceIssueCategoryName 279354 attribute is a MEDIUM_Name 279358 datatype. The ParentObjectPartMaintenanceIssueCategoryName 279354 attribute has a cardinality of zero or one 279356 meaning that for each instance of the Item 279272 entity there may be one ParentObjectPartMaintenanceIssueCategoryName 279354 attribute.

The Description 279360 attribute is a SHORT_Description 279364 datatype. The Description 279360 attribute has a cardinality of zero or one 279362 meaning that for each instance of the Item 279272 entity there may be one Description 279360 attribute.

The DetailedText 279366 attribute is a Text 279370 datatype. The DetailedText 279366 attribute has a cardinality of zero or one 279368 meaning that for each instance of the Item 279272 entity there may be one DetailedText 279366 attribute.

The OrdinalNumberValue 279372 attribute is an OrdinalNumberValue 279376 datatype. The OrdinalNumberValue 279372 attribute has a cardinality of one 279374 meaning that for each instance of the Item 279272 entity there is one OrdinalNumberValue 279372 attribute.

The Cause 279378 package includes a Cause 279380 entity.

The Cause 279380 entity has a cardinality of zero or n 279382 meaning that for each instance of the Item 279272 entity there may be one or more Cause 279380 entities. The Cause 279380 entity includes various attributes, namely ID 279384, CauseMaintenanceIssueCategoryCatalogueID 279390, CauseParentMaintenanceIssueCategoryID 279396, CauseMaintenanceIssueCategoryID 279402, SystemAdministrativeData 279408, ParentMaintenanceIssueCategoryName 279414, MaintenanceIssueCategoryName 279420, Description 279426, DetailedText 279432 and OrdinalNumberValue 279438.

The ID 279384 attribute is a MaintenanceRequestCauseID 279388 datatype. The ID 279384 attribute has a cardinality of one 279386 meaning that for each instance of the Cause 279380 entity there is one ID 279384 attribute.

The CauseMaintenanceIssueCategoryCatalogueID 279390 attribute is a MaintenanceIssueCategoryCatalogueID 279394 datatype. The CauseMaintenanceIssueCategoryCatalogueID 279390 attribute has a cardinality of zero or one 279392 meaning that for each instance of the Cause 279380 entity there may be one CauseMaintenanceIssueCategoryCatalogueID 279390 attribute.

The CauseParentMaintenanceIssueCategoryID 279396 attribute is a MaintenanceIssueCategoryID 279400 datatype. The CauseParentMaintenanceIssueCategoryID 279396 attribute has a cardinality of zero or one 279398 meaning that for each instance of the Cause 279380 entity there may be one CauseParentMaintenanceIssueCategoryID 279396 attribute.

The CauseMaintenanceIssueCategoryID 279402 attribute is a MaintenanceIssueCategoryID 279406 datatype. The CauseMaintenanceIssueCategoryID 279402 attribute has a cardinality of zero or one 279404 meaning that for each instance of the Cause 279380 entity there may be one CauseMaintenanceIssueCategoryID 279402 attribute.

The SystemAdministrativeData 279408 attribute is a SystemAdministrativeData 279412 datatype. The SystemAdministrativeData 279408 attribute has a cardinality of one 279410 meaning that for each instance of the Cause 279380 entity there is one SystemAdministrativeData 279408 attribute.

The ParentMaintenanceIssueCategoryName 279414 attribute is a MEDIUM_Name 279418 datatype. The ParentMaintenanceIssueCategoryName 279414 attribute has a cardinality of zero or one 279416 meaning that for each instance of the Cause 279380 entity there may be one ParentMaintenanceIssueCategoryName 279414 attribute.

The MaintenanceIssueCategoryName 279420 attribute is a MEDIUM_Name 279424 datatype. The MaintenanceIssueCategoryName 279420 attribute has a cardinality of zero or one 279422 meaning that for each instance of the Cause 279380 entity there may be one MaintenanceIssueCategoryName 279420 attribute.

The Description 279426 attribute is a SHORT_Description 279430 datatype. The Description 279426 attribute has a cardinality of zero or one 279428 meaning that for each instance of the Cause 279380 entity there may be one Description 279426 attribute.

The DetailedText 279432 attribute is a Text 279436 datatype. The DetailedText 279432 attribute has a cardinality of zero or one 279434 meaning that for each instance of the Cause 279380 entity there may be one DetailedText 279432 attribute.

The OrdinalNumberValue 279438 attribute is an OrdinalNumberValue 279442 datatype. The OrdinalNumberValue 279438 attribute has a cardinality of one 279440 meaning that for each instance of the Cause 279380 entity there is one OrdinalNumberValue 279438 attribute.

The Task 279444 package includes a Task 279446 entity.

The Task 279446 entity has a cardinality of zero or n 279448 meaning that for each instance of the Item 279272 entity there may be one or more Task 279446 entities. The Task 279446 entity includes various attributes, namely ID 279450, EmployeeResponsibleInternalID 279456, CompleterInternalID 279462, TaskMaintenanceIssueCategoryCatalogueID 279468, TaskParentMaintenanceIssueCategoryID 279474, TaskMaintenanceIssueCategoryID 279480 and SystemAdministrativeData 279486. The Task 279446 entity has various subordinate entities, namely EmployeeResponsibleInternalTypeCode 279492, StatusObject 279496, PlannedProcessingPeriod 279502, EmployeeResponsibleFormattedName 279508, PartyCompleterInternalName 279514, CompletedDateTime 279520, ParentTaskMaintenanceIssueCategoryName 279526, TaskMaintenanceIssueCategoryName 279532, Description 279538, DetailedText 279544 and OrdinalNumberValue 279550.

The ID 279450 attribute is a MaintenanceRequestTaskID 279454 datatype. The ID 279450 attribute has a cardinality of one 279452 meaning that for each instance of the Task 279446 entity there is one ID 279450 attribute.

The EmployeeResponsibleInternalID 279456 attribute is a PartyInternalID 279460 datatype. The EmployeeResponsibleInternalID 279456 attribute has a cardinality of zero or one 279458 meaning that for each instance of the Task 279446 entity there may be one EmployeeResponsibleInternalID 279456 attribute.

The CompleterInternalID 279462 attribute is a PartyInternalID 279466 datatype. The CompleterInternalID 279462 attribute has a cardinality of zero or one 279464 meaning that for each instance of the Task 279446 entity there may be one CompleterInternalID 279462 attribute.

The TaskMaintenanceIssueCategoryCatalogueID 279468 attribute is a MaintenanceIssueCategoryCatalogueID 279472 datatype. The TaskMaintenanceIssueCategoryCatalogueID 279468 attribute has a cardinality of zero or one 279470 meaning that for each instance of the Task 279446 entity there may be one TaskMaintenanceIssueCategoryCatalogueID 279468 attribute.

The TaskParentMaintenanceIssueCategoryID 279474 attribute is a MaintenanceIssueCategoryID 279478 datatype. The TaskParentMaintenanceIssueCategoryID 279474 attribute has a cardinality of zero or one 279476 meaning that for each instance of the Task 279446 entity there may be one TaskParentMaintenanceIssueCategoryID 279474 attribute.

The TaskMaintenanceIssueCategoryID 279480 attribute is a MaintenanceIssueCategoryID 279484 datatype. The TaskMaintenanceIssueCategoryID 279480 attribute has a cardinality of zero or one 279482 meaning that for each instance of the Task 279446 entity there may be one TaskMaintenanceIssueCategoryID 279480 attribute.

The SystemAdministrativeData 279486 attribute is a SystemAdministrativeData 279490 datatype. The SystemAdministrativeData 279486 attribute has a cardinality of one 279488 meaning that for each instance of the Task 279446 entity there is one SystemAdministrativeData 279486 attribute.

The EmployeeResponsibleInternalTypeCode 279492 entity has a cardinality of zero or one 279494 meaning that for each instance of the Task 279446 entity there may be one EmployeeResponsibleInternalTypeCode 279492 entity.

The StatusObject 279496 entity has a cardinality of one 279498 meaning that for each instance of the Task 279446 entity there is one StatusObject 279496 entity.

The PlannedProcessingPeriod 279502 entity has a cardinality of zero or one 279504 meaning that for each instance of the Task 279446 entity there may be one PlannedProcessingPeriod 279502 entity.

The EmployeeResponsibleFormattedName 279508 entity has a cardinality of zero or one 279510 meaning that for each instance of the Task 279446 entity there may be one EmployeeResponsibleFormattedName 279508 entity.

The PartyCompleterInternalName 279514 entity has a cardinality of zero or one 279516 meaning that for each instance of the Task 279446 entity there may be one PartyCompleterInternalName 279514 entity.

The CompletedDateTime 279520 entity has a cardinality of zero or one 279522 meaning that for each instance of the Task 279446 entity there may be one CompletedDateTime 279520 entity.

The ParentTaskMaintenanceIssueCategoryName 279526 entity has a cardinality of zero or one 279528 meaning that for each instance of the Task 279446 entity there may be one ParentTaskMaintenanceIssueCategoryName 279526 entity.

The TaskMaintenanceIssueCategoryName 279532 entity has a cardinality of zero or one 279534 meaning that for each instance of the Task 279446 entity there may be one TaskMaintenanceIssueCategoryName 279532 entity.

The DetailedText 279544 entity has a cardinality of zero or one 279546 meaning that for each instance of the Task 279446 entity there may be one DetailedText 279544 entity. The DetailedText 279544 entity includes a 1 279552 attribute.

The 1 279552 attribute is an OrdinalNumberValue 279554 datatype. The one 279552 attribute has a cardinality of one 279552 meaning that for each instance of the DetailedText 279544 entity there is one 279552 attribute.

The OrdinalNumberValue 279550 entity has a cardinality of one 279552 meaning that for each instance of the Task 279446 entity there is one OrdinalNumberValue 279550 entity.

The Activity 279556 package includes an Activity 279558 entity.

The Activity 279558 entity has a cardinality of zero or n 279560 meaning that for each instance of the Item 279272 entity there may be one or more Activity 279558 entities. The Activity 279558 entity includes various attributes, namely ID 279562, ActivityMaintenanceIssueCategoryCatalogueID 279568, ActivityParentMaintenanceIssueCategoryID 279574, ActivityMaintenanceIssueCategoryID 279580, SystemAdministrativeData 279586, ProcessingPeriod 279592, ParentMaintenanceIssueCategoryName 279598, MaintenanceIssueCategoryName 279604, Description 279610, DetailedText 279616 and OrdinalNumberValue 279622.

The ID 279562 attribute is a MaintenanceRequestActivityID 279566 datatype. The ID 279562 attribute has a cardinality of one 279564 meaning that for each instance of the Activity 279558 entity there is one ID 279562 attribute.

The ActivityMaintenanceIssueCategoryCatalogueID 279568 attribute is a MaintenanceIssueCategoryCatalogueID 279572 datatype. The ActivityMaintenanceIssueCategoryCatalogueID 279568 attribute has a cardinality of zero or one 279570 meaning that for each instance of the Activity 279558 entity there may be one ActivityMaintenanceIssueCategoryCatalogueID 279568 attribute.

The ActivityParentMaintenanceIssueCategoryID 279574 attribute is a MaintenanceIssueCategoryID 279578 datatype. The ActivityParentMaintenanceIssueCategoryID 279574 attribute has a cardinality of zero or one 279576 meaning that for each instance of the Activity 279558 entity there may be one ActivityParentMaintenanceIssueCategoryID 279574 attribute.

The ActivityMaintenanceIssueCategoryID 279580 attribute is a MaintenanceIssueCategoryID 279584 datatype. The ActivityMaintenanceIssueCategoryID 279580 attribute has a cardinality of zero or one 279582 meaning that for each instance of the Activity 279558 entity there may be one ActivityMaintenanceIssueCategoryID 279580 attribute.

The SystemAdministrativeData 279586 attribute is a SystemAdministrativeData 279590 datatype. The SystemAdministrativeData 279586 attribute has a cardinality of one 279588 meaning that for each instance of the Activity 279558 entity there is one SystemAdministrativeData 279586 attribute.

The ProcessingPeriod 279592 attribute is an UPPEROPEN_TIMEZONEINDEPENDENT_DateTimePeriod 279596 datatype. The ProcessingPeriod 279592 attribute has a cardinality of zero or one 279594 meaning that for each instance of the Activity 279558 entity there may be one ProcessingPeriod 279592 attribute.

The ParentMaintenanceIssueCategoryName 279598 attribute is a MEDIUM_Name 279602 datatype. The ParentMaintenanceIssueCategoryName 279598 attribute has a cardinality of zero or one 279600 meaning that for each instance of the Activity 279558 entity there may be one ParentMaintenanceIssueCategoryName 279598 attribute.

The MaintenanceIssueCategoryName 279604 attribute is a MEDIUM_Name 279608 datatype. The MaintenanceIssueCategoryName 279604 attribute has a cardinality of zero or one 279606 meaning that for each instance of the Activity 279558 entity there may be one MaintenanceIssueCategoryName 279604 attribute.

The Description 279610 attribute is a SHORT_Description 279614 datatype. The Description 279610 attribute has a cardinality of zero or one 279612 meaning that for each instance of the Activity 279558 entity there may be one Description 279610 attribute.

The DetailedText 279616 attribute is a Text 279620 datatype. The DetailedText 279616 attribute has a cardinality of zero or one 279618 meaning that for each instance of the Activity 279558 entity there may be one DetailedText 279616 attribute.

The OrdinalNumberValue 279622 attribute is an OrdinalNumberValue 279626 datatype. The OrdinalNumberValue 279622 attribute has a cardinality of one 279624 meaning that for each instance of the Activity 279558 entity there is one OrdinalNumberValue 279622 attribute.

The Task 279628 package includes a Task 279630 entity.

The Task 279630 entity has a cardinality of zero or n 279632 meaning that for each instance of the MaintenanceRequest 27908 entity there may be one or more Task 279630 entities. The Task 279630 entity includes various attributes, namely ID 279634, EmployeeResponsibleInternalID 279640, CompleterInternalID 279646, TaskMaintenanceIssueCategoryCatalogueID 279652, TaskParentMaintenanceIssueCategoryID 279658, TaskMaintenanceIssueCategoryID 279664 and SystemAdministrativeData 279670. The Task 279630 entity has various subordinate entities, namely EmployeeResponsibleInternalTypeCode 279676, StatusObject 279680, PlannedProcessingPeriod 279686, EmployeeResponsibleFormattedName 279692, PartyCompleterInternalName 279698, CompletedDateTime 279704, ParentTaskMaintenanceIssueCategoryName 279710, TaskMaintenanceIssueCategoryName 279716, Description 279722, DetailedText 279728 and OrdinalNumberValue 279734.

The ID 279634 attribute is a MaintenanceRequestTaskID 279638 datatype. The ID 279634 attribute has a cardinality of one 279636 meaning that for each instance of the Task 279630 entity there is one ID 279634 attribute.

The EmployeeResponsibleInternalID 279640 attribute is a PartyInternalID 279644 datatype. The EmployeeResponsibleInternalID 279640 attribute has a cardinality of zero or one 279642 meaning that for each instance of the Task 279630 entity there may be one EmployeeResponsibleInternalID 279640 attribute.

The CompleterInternalID 279646 attribute is a PartyInternalID 279650 datatype. The CompleterInternalID 279646 attribute has a cardinality of zero or one 279648 meaning that for each instance of the Task 279630 entity there may be one CompleterInternalID 279646 attribute.

The TaskMaintenanceIssueCategoryCatalogueID 279652 attribute is a MaintenanceIssueCategoryCatalogueID 279656 datatype. The TaskMaintenanceIssueCategoryCatalogueID 279652 attribute has a cardinality of zero or one 279654 meaning that for each instance of the Task 279630 entity there may be one TaskMaintenanceIssueCategoryCatalogueID 279652 attribute.

The TaskParentMaintenanceIssueCategoryID 279658 attribute is a MaintenanceIssueCategoryID 279662 datatype. The TaskParentMaintenanceIssueCategoryID 279658 attribute has a cardinality of zero or one 279660 meaning that for each instance of the Task 279630 entity there may be one TaskParentMaintenanceIssueCategoryID 279658 attribute.

The TaskMaintenanceIssueCategoryID 279664 attribute is a MaintenanceIssueCategoryID 279668 datatype. The TaskMaintenanceIssueCategoryID 279664 attribute has a cardinality of zero or one 279666 meaning that for each instance of the Task 279630 entity there may be one TaskMaintenanceIssueCategoryID 279664 attribute.

The SystemAdministrativeData 279670 attribute is a SystemAdministrativeData 279674 datatype. The SystemAdministrativeData 279670 attribute has a cardinality of one 279672 meaning that for each instance of the Task 279630 entity there is one SystemAdministrativeData 279670 attribute.

The EmployeeResponsibleInternalTypeCode 279676 entity has a cardinality of zero or one 279678 meaning that for each instance of the Task 279630 entity there may be one EmployeeResponsibleInternalTypeCode 279676 entity.

The StatusObject 279680 entity has a cardinality of one 279682 meaning that for each instance of the Task 279630 entity there is one StatusObject 279680 entity.

The PlannedProcessingPeriod 279686 entity has a cardinality of zero or one 279688 meaning that for each instance of the Task 279630 entity there may be one PlannedProcessingPeriod 279686 entity.

The EmployeeResponsibleFormattedName 279692 entity has a cardinality of zero or one 279694 meaning that for each instance of the Task 279630 entity there may be one EmployeeResponsibleFormattedName 279692 entity.

The PartyCompleterInternalName 279698 entity has a cardinality of zero or one 279700 meaning that for each instance of the Task 279630 entity there may be one PartyCompleterInternalName 279698 entity.

The CompletedDateTime 279704 entity has a cardinality of zero or one 279706 meaning that for each instance of the Task 279630 entity there may be one CompletedDateTime 279704 entity.

The ParentTaskMaintenanceIssueCategoryName 279710 entity has a cardinality of zero or one 279712 meaning that for each instance of the Task 279630 entity there may be one ParentTaskMaintenanceIssueCategoryName 279710 entity.

The TaskMaintenanceIssueCategoryName 279716 entity has a cardinality of zero or one 279718 meaning that for each instance of the Task 279630 entity there may be one TaskMaintenanceIssueCategoryName 279716 entity.

The Description 279722 entity has a cardinality of zero or one 279724 meaning that for each instance of the Task 279630 entity there may be one Description 279722 entity.

The DetailedText 279728 entity has a cardinality of zero or one 279730 meaning that for each instance of the Task 279630 entity there may be one DetailedText 279728 entity.

The OrdinalNumberValue 279734 entity has a cardinality of one 279736 meaning that for each instance of the Task 279630 entity there is one OrdinalNumberValue 279734 entity.

The Activity 279740 package includes an Activity 279742 entity.

The Activity 279742 entity has a cardinality of zero or n 279744 meaning that for each instance of the MaintenanceRequest 27908 entity there may be one or more Activity 279742 entities. The Activity 279742 entity includes various attributes, namely ID 279746, ActivityMaintenanceIssueCategoryCatalogueID 279752, ActivityParentMaintenanceIssueCategoryID 279758, ActivityMaintenanceIssueCategoryID 279764, SystemAdministrativeData 279770, ProcessingPeriod 279776, ParentMaintenanceIssueCategoryName 279782, MaintenanceIssueCategoryName 279788, Description 279794, DetailedText 279800 and OrdinalNumberValue 279806.

The ID 279746 attribute is a MaintenanceRequestActivityID 279750 datatype. The ID 279746 attribute has a cardinality of one 279748 meaning that for each instance of the Activity 279742 entity there is one ID 279746 attribute.

The ActivityMaintenanceIssueCategoryCatalogueID 279752 attribute is a MaintenanceIssueCategoryCatalogueID 279756 datatype. The ActivityMaintenanceIssueCategoryCatalogueID 279752 attribute has a cardinality of zero or one 279754 meaning that for each instance of the Activity 279742 entity there may be one ActivityMaintenanceIssueCategoryCatalogueID 279752 attribute.

The ActivityParentMaintenanceIssueCategoryID 279758 attribute is a MaintenanceIssueCategoryID 279762 datatype. The ActivityParentMaintenanceIssueCategoryID 279758 attribute has a cardinality of zero or one 279760 meaning that for each instance of the Activity 279742 entity there may be one ActivityParentMaintenanceIssueCategoryID 279758 attribute.

The ActivityMaintenanceIssueCategoryID 279764 attribute is a MaintenanceIssueCategoryID 279768 datatype. The ActivityMaintenanceIssueCategoryID 279764 attribute has a cardinality of zero or one 279766 meaning that for each instance of the Activity 279742 entity there may be one ActivityMaintenanceIssueCategoryID 279764 attribute.

The SystemAdministrativeData 279770 attribute is a SystemAdministrativeData 279774 datatype. The SystemAdministrativeData 279770 attribute has a cardinality of one 279772 meaning that for each instance of the Activity 279742 entity there is one SystemAdministrativeData 279770 attribute.

The ProcessingPeriod 279776 attribute is an UPPEROPEN_TIMEZONEINDEPENDENT_DateTimePeriod 279780 datatype. The ProcessingPeriod 279776 attribute has a cardinality of zero or one 279778 meaning that for each instance of the Activity 279742 entity there may be one ProcessingPeriod 279776 attribute.

The ParentMaintenanceIssueCategoryName 279782 attribute is a MEDIUM_Name 279786 datatype. The ParentMaintenanceIssueCategoryName 279782 attribute has a cardinality of zero or one 279784 meaning that for each instance of the Activity 279742 entity there may be one ParentMaintenanceIssueCategoryName 279782 attribute.

The MaintenanceIssueCategoryName 279788 attribute is a MEDIUM_Name 279792 datatype. The MaintenanceIssueCategoryName 279788 attribute has a cardinality of zero or one 279790 meaning that for each instance of the Activity 279742 entity there may be one MaintenanceIssueCategoryName 279788 attribute.

The Description 279794 attribute is a SHORT_Description 279798 datatype. The Description 279794 attribute has a cardinality of zero or one 279796 meaning that for each instance of the Activity 279742 entity there may be one Description 279794 attribute.

The DetailedText 279800 attribute is a Text 279804 datatype. The DetailedText 279800 attribute has a cardinality of zero or one 279802 meaning that for each instance of the Activity 279742 entity there may be one DetailedText 279800 attribute.

The OrdinalNumberValue 279806 attribute is an OrdinalNumberValue 279810 datatype. The OrdinalNumberValue 279806 attribute has a cardinality of one 279808 meaning that for each instance of the Activity 279742 entity there is one OrdinalNumberValue 279806 attribute.

MaintenanceRequest Package

The MaintenanceRequest package groups the MaintenanceRequest with its entities.

MaintenanceRequest

A MaintenanceRequest is a request for maintenance of a product or an installation point. Maintenance requests document maintenance tasks completely, and make them available for analysis in the long term. It also helps in preliminary planning and execution of tasks.

ID refers to an identifier for a maintenance request. ProjectWorkBreakdownStructureElementID (may be optional) refers to an identifier for a Project Work Breakdown Structure Element. A Project Work Breakdown Structure (WBS) organizes the different tasks involved in the project in a hierarchical structure. The WBS consists of a number of WBS elements. A WBS element represents a certain task or a partial task that can be subdivided further. IssueMaintenanceIssueCategoryCatalogueID (may be optional) refers to an identifier for a catalogue of categories for maintenance-related issues of type Issue. IssueParentMaintenanceIssueCategoryID (may be optional) may be directly superordinate to a particular category, it is an identifier for a category of a maintenance-related issue of type Issue. IssueMaintenanceIssueCategoryID (may be optional) refers to an identifier for a category of a maintenance-related issue of type Subject. MaterialInternalID (may be optional) refers to a proprietary identifier for a material. This is the identifier of a material for which maintenance request is being created. InstallationPointID (may be optional) refers to a unique identifier for an installation point. It is the identifier of an installation point for which maintenance request is being created. IndividualMaterialID (may be optional) refers to a proprietary identifier for an individual material. It is the identifier of an individual material for which maintenance request is being created. SerialID (may be optional) refers to a unique identifier for an individual material that is assigned in the maintenance request. MaintenancePlantID (may be optional) refers to a plant in which the product and installation point of a company are installed and maintained. MaintenancePlanningPlantID (may be optional) refers to an identifier of a plant in which the planning and the supervision of the execution of maintenance work is done. MaintenanceWorkCentreID (may be optional) refers to an identifier of a WorkCentre where the execution of maintenance work is done. MaintenanceWorkCentrePlantID (may be optional) refers to an identifier of a Plant where the work centre which is responsible for the execution of maintenance work is present. ReporterInternalID (may be optional) refers to a proprietary identifier for a party which reports a maintenance request. LocationInternalID (may be optional) refers to a proprietary identifier for a location of the product or installation point that has to be maintained within a maintenance plant. AffectedInstallationPointID (may be optional) refers to a unique identifier of an installation point which has a side effect by the maintenance request. AffectedIndividualMaterialID (may be optional) refers to a proprietary identifier of an individual material which has a side effect by the maintenance request. ImportanceCode (may be optional) refers to the coded representation of the importance of maintenance request. ProductionPlannerGroupCode (may be optional) refers to the coded representation of a MaintenancePlannerGroup. RequestedProcessingPeriod (may be optional) refers to a Period is a period during which processing of the maintenance request is requested. MachineryBreakdownIndicator (may be optional) refers to the representation of machinery in the state of breakdown. It indicates whether the machinery is in the state of breakdown or not. MachineryMalfunctionPeriod (may be optional) refers to a period during which machinery has or had malfunctions. MachineryBreakdownDuration (may be optional) refers to a period of time of a particular length without a fixed start or end time, during which a machinery is in the state breakdown. MachineryBreakdownDuration can be entered when the MachineryBreakdownIndicator is set to true. AffectedIndividualMaterialDescription (may be optional) refers to the affected individual material. AffectedInstallationPointDescription (may be optional) refers to the affected installation point. StatusObject describes the processing status of a maintenance request in structured form. ImportanceName (may be optional) refers to the importance code. TypeName (may be optional) refers to the name of maintenance request type code. LocationDescription (may be optional) refers to the description for a location. MaintenanceWorkCentreDescription (may be optional) refers to a description of the maintenance work centre. SystemAdministrativeData (may be optional) refers to administrative data that is stored in a system. This data includes system users and change dates/times. MaintenancePlanningPlantDescription (may be optional) refers to the maintenance planning plant. MaintenancePlantDescription (may be optional) refers to the maintenance plant. InstallationPointDescription (may be optional) refers to the installation point. IndividualMaterialDescription (may be optional) refers to the individual material. MaterialDescription (may be optional) refers to a material. Description (may be optional) refers to a representation of the properties of a maintenance request in natural language. DetailedText (may be optional) refers to a language-dependent specification for a maintenance request. A MaintenanceIssueCategoryID can be unique in combination with a ParentMaintenanceIssueCategoryID and MaintenanceIssueCategoryCatalogueID.

Item Package

An Item package groups together all the relevant information in terms of an item.

Item

An item is an individual problem or exceptional situation that has occurred with a product or an installation point. ID refers to an identifier for a maintenance request item. MaterialInternalID (may be optional) refers to a proprietary identifier for a material in a maintenance request item. DamageMaintenanceIssueCategoryCatalogueID (may be optional) refers to an identifier for a catalogue of categories for maintenance-related issues of type Damage. DamageParentMaintenanceIssueCategoryID (may be optional) may be directly superordinate to a particular category, it is an identifier for a category of a maintenance-related issue of type Subject. DamageMaintenanceIssueCategoryID (may be optional) refers to an identifier for a category of a maintenance-related issue of type Damage. ObjectPartMaintenanceIssueCategoryCatalogueID (may be optional) refers to an identifier for a catalogue of categories for maintenance-related issues of type ObjectPart. ObjectPartParentMaintenanceIssueCategoryID (may be optional) may be directly superordinate to a particular category, it is an identifier for a category of a maintenance-related issue of type ObjectPart. ObjectPartMaintenanceIssueCategoryID (may be optional) refers to an identifier for a category of a maintenance-related issue of type ObjectPart. ObjectPartParentMaintenanceIssueCategoryName (may be optional) refers to the object part parent category. ObjectPartMaintenanceIssueCategoryName (may be optional) refers to the object part category. DamageParentMaintenanceIssueCategoryName (may be optional) refers to the damage parent category. DamageMaintenanceIssueCategoryName (may be optional) refers to the damage category. SystemAdministrativeData (may be optional) refers to administrative data that is stored in a system. This data includes system users and change dates/times. Description (may be optional) refers to a representation of the properties of a maintenance request item in natural language. DetailedText (may be optional) refers to a language-dependent specification for a maintenance request item. OrdinalNumberValue refers to a number that indicates the position of a maintenance request item in a linearly ordered set that is ordered according to particular factors. A MaintenanceIssueCategoryID can be unique in combination with a ParentMaintenanceIssueCategoryID and MaintenanceIssueCategoryCatalogueID. A maintenance request refers to an item but it is possible to create a maintenance request without one. It is possible to attach more than one task, activity and cause per item.

Cause

A Cause is a cause that led to the occurrence of the malfunction or exceptional situation in a product or an installation point. ID refers to an identifier for a maintenance request cause. CauseMaintenanceIssueCategoryCatalogueID (may be optional) refers to an identifier for a catalogue of categories for maintenance-related issues of type Cause. CauseParentMaintenanceIssueCategoryID (may be optional) may be directly superordinate to a particular category, it is an identifier for a category of a maintenance-related issue of type Cause. CauseMaintenanceIssueCategoryID (may be optional) refers to an identifier for a category of a maintenance-related issue of type Cause. CauseParentMaintenanceIssueCategoryName (may be optional) refers to the parent category of type cause. CauseMaintenanceIssueCategoryName (may be optional) refers to the category of type cause. SystemAdministrativeData (may be optional) refers to administrative data that is stored in a system. This data includes system users and change dates/times. Description (may be optional) refers to a representation of the properties of a maintenance request item cause in natural language. DetailedText (may be optional) refers to a language-dependent specification for a maintenance request item cause. OrdinalNumberValue refers to a number that indicates the position of an maintenance request item cause in a linearly ordered set that is ordered according to particular factors. A MaintenanceIssueCategoryID can be unique in combination with a ParentMaintenanceIssueCategoryID and MaintenanceIssueCategoryCatalogueID.

Task

A Task is a long-term action required to rectify the malfunction or exceptional situation in a product or an installation point. ID identifies a task. EmployeeResponsibleInternalID (may be optional) refers to a proprietary identifier for a EmployeeResponsible who is responsible for processing a task. CompletorInternalID (may be optional) refers to an identifier of the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task.

EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. TaskParentMaintenanceIssueCategoryName (may be optional) refers to the parent category of type Task. TaskMaintenanceIssueCategoryName (may be optional) refers to the category of type Task. SystemAdministrativeData (may be optional) refers to administrative data that is stored in a system. This data includes system users and change dates/times. StatusObject refers to the processing status of a maintenance request item task in structured form. EmployeeResponsibleFormattedName (may be optional) refers to a complete formatted name of a party which processes a task. PartyCompleterInternalName (may be optional) refers to the party which completed a task. CompletionDateTime (may be optional) refers to a date and time when a task was completed. Description (may be optional) refers to a description for a task. DetailedText (may be optional) refers to a detailed text for a task. OrdinalNumberValue refers to a number that indicates the position of a maintenance request task in a linearly ordered set that is ordered according to particular factors. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as, the key for the task to be performed and a brief instruction describing what is to be done, the planned start and end dates for the task, and the task status.

Activity

An Activity is a short-term action that shall be executed immediately to rectify the malfunction or exceptional situation in a product or an installation point. ID refers to an identifier for an activity. ActivityMaintenanceIssueCategoryCatalogueID (may be optional) refers to a maintenance issue category catalogue of type Activity. ActivityParentMaintenanceIssueCategoryID (may be optional) refers to a parent category of type Activity. ActivityMaintenanceIssueCategoryID (may be optional) refers to a category of type Activity. ProcessingPeriod (may be optional) refers to a period during which an activity is carried out. ActivityParentMaintenanceIssueCategoryName (may be optional) refers to the parent category of type Activity. ActivityMaintenanceIssueCategoryName (may be optional) refers to the category of type Activity. SystemAdministrativeData (may be optional) refers to administrative data that is stored in a system. This data includes system users and change dates/times. Description (may be optional) refers to a description for an activity. DetailedText (may be optional) refers to detailed text for an activity. OrdinalNumberValue refers to the position of an activity in a sorted list. A MaintenanceIssueCategoryID can be unique in combination with a ParentMaintenanceIssueCategoryID and MaintenanceIssueCategoryCatalogueID.

Task Package

A Task package groups together all the relevant information in terms of a task.

Task

A Task is a long-term action required to rectify the malfunction or exceptional situation in a product or an installation point. ID identifies a task. EmployeeResponsibleInternalID (may be optional) refers to a proprietary identifier for a EmployeeResponsible who is responsible for processing a task. CompletorInternalID (may be optional) refers to the party which completed a task. TaskMaintenanceIssueCategoryCatalogueID (may be optional) refers to an identifier for a catalogue of categories for maintenance-related issues of type Task. TaskParentMaintenanceIssueCategoryID (may be optional) may be directly superordinate to a particular category, it is an identifier for a category of a maintenance-related issue of type Task. TaskMaintenanceIssueCategoryID (may be optional) refers to an identifier for a category of a maintenance-related issue of type Task. EmployeeResponsibleInternalTypeCodeID (may be optional) refers to the TypeCode for the EmployeeResponsible who is responsible for processing a task. PlannedProcessingPeriod (may be optional) refers to a period which has been planned for processing a maintenance request task. TaskParentMaintenanceIssueCategoryName (may be optional) refers to the parent category of type Task. TaskMaintenanceIssueCategoryName (may be optional) refers to the category of type Task. SystemAdministrativeData (may be optional) refers to administrative data that is stored in a system. This data includes system users and change dates/times. StatusObject refers to the processing status of a maintenance request item task in structured form. EmployeeResponsibleFormattedName (may be optional) refers to the complete formatted name of a party which processes a task. PartyCompleterInternalName (may be optional) refers to the party which completed a task. CompletionDateTime (may be optional) refers to the date and time when a task was completed. Description (may be optional) refers to description for a task. DetailedText (may be optional) refers to a detailed text for a task. OrdinalNumberValue refers to a number that indicates the position of a maintenance request task in a linearly ordered set that is ordered according to particular factors. A MaintenanceIssueCategoryID can be unique in combination with a ParentMaintenanceIssueCategoryID and MaintenanceIssueCategoryCatalogueID.

Using a task, one can plan how different people can interact to process a request and track how various activities are completed within a specified period of time. Several details for each task can be entered such as the key for the task to be performed and a brief instruction describing what is to be done, the planned start and end dates for the task, and the task status.

Activity Package

An Activity package groups together all the relevant information in terms of a activity.

Activity

An Activity is a short-term action that shall be executed immediately to rectify the malfunction or exceptional situation in a product or an installation point. ID refers to the identifier for an activity. ActivityMaintenanceIssueCategoryCatalogueID (may be optional) refers to a maintenance issue category catalogue of type Activity. ActivityParentMaintenanceIssueCategoryID (may be optional) refers to a parent category of type Activity. ActivityMaintenanceIssueCategoryID (may be optional) refers to a category of type Activity. ProcessingPeriod (may be optional) refers to a period during which an activity is carried out. ActivityParentMaintenanceIssueCategoryName (may be optional) refers to the parent category of type Activity. ActivityMaintenanceIssueCategoryName (may be optional) refers to the category of type Activity. SystemAdministrativeData (may be optional) refers to administrative data that is stored in a system. This data includes system users and change dates/times. Description (may be optional) refers to a description for an activity. DetailedText (may be optional) refers to a detailed text for an activity. OrdinalNumberValue refers to the position of an activity in a sorted list. A MaintenanceIssueCategoryID can be unique in combination with a ParentMaintenanceIssueCategoryID and MaintenanceIssueCategoryCatalogueID.

Party Package

A Party package groups together all the relevant information in terms of a party.

VendorParty

A VendorParty is a party that delivers goods or provides services. InternalID (may be optional) refers to an identifier for a party. FormattedName (may be optional) refers to a complete formatted name of a party.

ManufacturerParty

A ManufacturerParty is a party that manufactures goods. InternalID (may be optional) refers to an identifier for a party. FormattedName (may be optional) refers to a complete formatted name of a party.

Party

A Party is a natural person, organization, or business partner group that is involved in a MaintenanceRequest. This could be a person, organization or group inside or outside of the company. InternalID (may be optional) refers to an identifier for a party. RoleCode (may be optional) refers to a coded representation of a PartyRole. FormattedName (may be optional) refers to a complete formatted name of a party.

Log Package

A Log package groups the error messages used for user interaction

Log

A Log is a sequence of messages that result when an application executes a task.

Message Data Type

The message data type MaintenanceRequestSimpleByInstallationPointAndIndividualMaterialQueryMessage_sync contains the Selection for the Maintenance Request. FIG. 293 shows a MaintenanceRequestSimpleByIndividualMaterialAndInstallationPointQueryMessage_sync 29300 package. The MaintenanceRequestSimpleByIndividualMaterialAndInstallationPointQueryMessage_sync 29300 package is a MaintenanceRequestSimpleByIndividualMaterialAndInstallationPointQueryMessage_sync 29304 datatype. The MaintenanceRequestSimpleByIndividualMaterialAndInstallationPointQueryMessage_sync 29300 package includes a MaintenanceRequestSimpleByIndividualMaterialAndInstallationPointQueryMessage_sync 29302 entity. The MaintenanceRequestSimpleByIndividualMaterialAndInstallationPointQueryMessage_sync 29300 package includes various packages, namely MessageHeader 29306 and Selection 29314.

The MessageHeader 29306 package is a BasicBusinessDocumentMessageHeader 29312 datatype. The MessageHeader 29306 package includes a MessageHeader 29308 entity.

The MessageHeader 29308 entity has a cardinality of zero or one 29310 meaning that for each instance of the MaintenanceRequestSimpleByIndividualMaterialAndInstallationPointQueryMessage_sync 29302 entity there may be one MessageHeader 29308 entity.

The Selection 29314 package includes a MaintenanceRequestSimpleSelectionByIndividualMaterialAndInstallationPoint 29316 entity. The MaintenanceRequestSimpleSelectionByIndividualMaterialAndInstallationPoint 29316 entity has a cardinality of one 29318 meaning that for each instance of the MaintenanceRequestSimpleByIndividualMaterialAndInstallationPointQueryMessage_sync 29302 entity there is one MaintenanceRequestSimpleSelectionByIndividualMaterialAndInstallationPoint 29316 entity. The MaintenanceRequestSimpleSelectionByIndividualMaterialAndInstallationPoint 29316 entity includes various attributes, namely InstallationPointID 29320 and IndividualMaterialID 29326.

The InstallationPointID 29320 attribute is an InstallationPointID 29324 datatype. The InstallationPointID 29320 attribute has a cardinality of zero or one 29322 meaning that for each instance of the MaintenanceRequestSimpleSelectionByIndividualMaterialAndInstallationPoint 29316 entity there may be one InstallationPointID 29320 attribute.

The IndividualMaterialID 29326 attribute is a ProductInternalID 29330 datatype. The IndividualMaterialID 29326 attribute has a cardinality of zero or one 29328 meaning that for each instance of the MaintenanceRequestSimpleSelectionByIndividualMaterialAndInstallationPoint 29316 entity there may be one IndividualMaterialID 29326 attribute.

Selection Package

The Selection package collects all the selection criteria for Maintenance Request.

MaintenanceRequestSimpleSelectionByIndividualMaterialAndInstallationPoint

MaintenanceRequestSimpleSelectionByIndividualMaterialAndInstallationPoint specifies selection criteria to select MaintenanceRequest by IndividualMaterialID and InstallationPointID. IndividualMaterialID (may be optional) refers to an identifier an individual material. InstallationPointID (may be optional) refers to an identifier for an installation point.

Message Data Type

The message data type MaintenanceRequestSimpleByIndividualMaterialAndInstallationPointResponseMessage_sync contains the Maintenance Request included in the business document and the Log. FIGS. 294-1 through 294-2 show a MaintenanceRequestSimpleByIndividualMaterialAndInstallationPointResponseMessage_sync 29400 package. The MaintenanceRequestSimpleByIndividualMaterialAndInstallationPointResponseMessage_sync 29400 package is a MaintenanceRequestSimpleByIndividualMaterialAnd InstallationPointResponseMessage_sync 29404 datatype. The MaintenanceRequestSimpleByIndividualMaterialAndInstallationPointResponseMessage_sync 29400 package includes a MaintenanceRequestSimpleByIndividualMaterialAndInstallationPointResponseMessage_sync 29402 entity. The MaintenanceRequestSimpleByIndividualMaterialAndInstallation PointResponseMessage_sync 29400 package includes various packages, namely MessageHeader 29406, MaintenanceRequest 29414 and Log 29438.

The MessageHeader 29406 package is a BasicBusinessDocumentMessageHeader 29412 datatype. The MessageHeader 29406 package includes a MessageHeader 29408 entity.

The MessageHeader 29408 entity has a cardinality of zero or one 29410 meaning that for each instance of the MaintenanceRequestSimpleByIndividualMaterialAndInstallationPointResponseMessage_sync 29402 entity there may be one MessageHeader 29408 entity.

The MaintenanceRequest 29414 package includes a MaintenanceRequest 29416 entity.

The MaintenanceRequest 29416 entity has a cardinality of zero or n 29418 meaning that for each instance of the MaintenanceRequestSimpleByIndividualMaterialAndInstallationPointResponseMessage_sync 29402 entity there may be one or more MaintenanceRequest 29416 entities. The MaintenanceRequest 29416 entity includes various attributes, namely ID 29420, TypeCode 29426 and Description 29432.

The ID 29420 attribute is a MaintenanceRequestID 29424 datatype. The ID 29420 attribute has a cardinality of one 29422 meaning that for each instance of the MaintenanceRequest 29416 entity there is one ID 29420 attribute.

The TypeCode 29426 attribute is a MaintenanceRequestTypeCode 29430 datatype. The TypeCode 29426 attribute has a cardinality of one 29428 meaning that for each instance of the MaintenanceRequest 29416 entity there is one TypeCode 29426 attribute.

The Description 29432 attribute is a SHORT_Description 29436 datatype. The Description 29432 attribute has a cardinality of zero or one 29434 meaning that for each instance of the MaintenanceRequest 29416 entity there may be one Description 29432 attribute.

The Log 29438 package is a Log 29444 datatype. The Log 29438 package includes a Log 29440 entity.

The Log 29440 entity has a cardinality of one 29442 meaning that for each instance of the MaintenanceRequestSimpleByIndividualMaterialAndInstallationPointResponseMessage_sync 29402 entity there is one Log 29440 entity.

MaintenanceRequest Package

MaintenanceRequest

A MaintenanceRequest is a request for maintenance of a product or an installation point. ID (may be optional) refers to an identifier of a maintenance request. Description (may be optional) refers to a description of the maintenance request.

Log Package

A Log package groups the error messages used for user interaction

Log

A Log is a sequence of messages that result when an application executes a task.

Message Data Type

The message data type MaintenanceRequestReleaseRequestMessage_sync contains the Maintenance Request ID and the status of a Maintenance Request. FIG. 292 shows a MaintenanceRequestReleaseRequestMessage_sync 29200 package. The MaintenanceRequestReleaseRequestMessage_sync 29200 package is a MaintenanceRequestReleaseRequestMessage_sync 29204 datatype. The MaintenanceRequestReleaseRequestMessage_sync 29200 package includes a MaintenanceRequestReleaseRequestMessage_sync 29202 entity. The MaintenanceRequestReleaseRequestMessage_sync 29200 package includes various packages, namely MessageHeader 29206 and MaintenanceRequest 29214.

The MessageHeader 29206 package is a BasicBusinessDocumentMessageHeader 29212 datatype. The MessageHeader 29206 package includes a MessageHeader 29208 entity.

The MessageHeader 29208 entity has a cardinality of zero or one 29210 meaning that for each instance of the MaintenanceRequestReleaseRequestMessage_sync 29202 entity there may be one MessageHeader 29208 entity.

The MaintenanceRequest 29214 package includes a MaintenanceRequest 29216 entity.

The MaintenanceRequest 29216 entity has a cardinality of zero or one 29218 meaning that for each instance of the MaintenanceRequestReleaseRequestMessage_sync 29202 entity there may be one MaintenanceRequest 29216 entity. The MaintenanceRequest 29216 entity includes an ID 29220 attribute.

The ID 29220 attribute is a MaintenanceRequestID 29224 datatype. The ID 29220 attribute has a cardinality of one 29222 meaning that for each instance of the MaintenanceRequest 29216 entity there is one ID 29220 attribute.

MessageHeader

A MessageHeader groups business information from the perspective of the sending application such as information to identify the business document in a message.

MaintenanceRequest Package

The MaintenanceRequest package contains the status information about a particular Maintenance Request to be updated.

MaintenanceRequest

The MaintenanceRequest specifies the maintenance request for which status has to be set. ID refers to an identifier of a maintenance request.

Message Data Type

FIG. 291 shows a MaintenanceRequestReleaseConfirmationMessage_sync 29100 package. The MaintenanceRequestReleaseConfirmationMessage_sync 29100 package is a MaintenanceRequestReleaseConfirmationMessage_sync 29104 datatype. The MaintenanceRequestReleaseConfirmationMessage_sync 29100 package includes a MaintenanceRequestReleaseConfirmationMessage_sync 29102 entity. The MaintenanceRequestReleaseConfirmationMessage_sync 29100 package includes various packages, namely MessageHeader 29106 and Log 29114.

The MessageHeader 29106 package is a BasicBusinessDocumentMessageHeader 29112 datatype. The MessageHeader 29106 package includes a MessageHeader 29108 entity.

The MessageHeader 29108 entity has a cardinality of zero or one 29110 meaning that for each instance of the MaintenanceRequestReleaseConfirmationMessage_sync 29102 entity there may be one MessageHeader 29108 entity.

The Log 29114 package is a Log 29120 datatype. The Log 29114 package includes a Log 29116 entity.

The Log 29116 entity has a cardinality of one 29118 meaning that for each instance of the MaintenanceRequestReleaseConfirmationMessage_sync 29102 entity there is one Log 29116 entity.

MessageHeader Package

A MessageHeader package groups the business information that is relevant for sending a business document in a message.

MessageHeader

A MessageHeader groups business information from the perspective of the sending application such as information to identify the business document in a message.

MaintenanceRequest Package

The MaintenanceRequest package contains the status information about a particular Maintenance Request to be updated.

MaintenanceRequest

The MaintenanceRequest specifies the maintenance request for which status has to be set. ID refers to an identifier of a maintenance request.

Log Package

A Log package groups the error messages used for user interaction

Log

A Log is a sequence of messages that result when an application executes a task.

Message Data Type

The message data type MaintenanceRequestCloseRequestMessage_sync contains the Maintenance Request ID and the status of a Maintenance Request. FIG. 286 shows a MaintenanceRequestCloseRequestMessage_sync 28600 package. The MaintenanceRequestCloseRequestMessage_sync 28600 package is a MaintenanceRequestCloseRequestMessage_sync 28604 datatype. The MaintenanceRequestCloseRequestMessage_sync 28600 package includes a MaintenanceRequestCloseRequestMessage_sync 28602 entity. The MaintenanceRequestCloseRequestMessage_sync 28600 package includes various packages, namely MessageHeader 28606 and MaintenanceRequest 28614.

The MessageHeader 28606 package is a BasicBusinessDocumentMessageHeader 28612 datatype. The MessageHeader 28606 package includes a MessageHeader 28608 entity.

The MessageHeader 28608 entity has a cardinality of zero or one 28610 meaning that for each instance of the MaintenanceRequestCloseRequestMessage_sync 28602 entity there may be one MessageHeader 28608 entity.

The MaintenanceRequest 28614 package includes a MaintenanceRequest 28616 entity.

The MaintenanceRequest 28616 entity has a cardinality of zero or one 28618 meaning that for each instance of the MaintenanceRequestCloseRequestMessage_sync 28602 entity there may be one MaintenanceRequest 28616 entity. The MaintenanceRequest 28616 entity includes an ID 28620 attribute.

The ID 28620 attribute is a MaintenanceRequestID 28624 datatype. The ID 28620 attribute has a cardinality of one 28622 meaning that for each instance of the MaintenanceRequest 28616 entity there is one ID 28620 attribute.

MessageHeader Package

A MessageHeader package groups the business information that is relevant for sending a business document in a message.

MessageHeader

A MessageHeader groups business information from the perspective of the sending application such as information to identify the business document in a message.

MaintenanceRequest Package

The MaintenanceRequest package contains the status information about a particular Maintenance Request to be updated.

MaintenanceRequest

The MaintenanceRequest specifies the maintenance request for which status has to be set. ID refers to an identifier of a maintenance request.

Message Data Type

FIG. 285 shows a MaintenanceRequestCloseConfirmationMessage_sync 28500 package. The MaintenanceRequestCloseConfirmationMessage_sync 28500 package is a MaintenanceRequestCloseConfirmationMessage_sync 28504 datatype. The MaintenanceRequestCloseConfirmationMessage_sync 28500 package includes a MaintenanceRequestCloseConfirmationMessage_sync 28502 entity. The MaintenanceRequestCloseConfirmationMessage_sync 28500 package includes various packages, namely MessageHeader 28506 and Log 28514.

The MessageHeader 28506 package is a BasicBusinessDocumentMessageHeader 28512 datatype. The MessageHeader 28506 package includes a MessageHeader 28508 entity.

The MessageHeader 28508 entity has a cardinality of zero or one 28510 meaning that for each instance of the MaintenanceRequestCloseConfirmationMessage_sync 28502 entity there may be one MessageHeader 28508 entity.

The Log 28514 package is a Log 28520 datatype. The Log 28514 package includes a Log 28516 entity.

The Log 28516 entity has a cardinality of one 28518 meaning that for each instance of the MaintenanceRequestCloseConfirmationMessage_sync 28502 entity there is one Log 28516 entity.

MessageHeader Package

A MessageHeader package groups the business information that is relevant for sending a business document in a message.

MessageHeader

A MessageHeader groups business information from the perspective of the sending application such as information to identify the business document in a message.

Log Package

A Log package groups the error messages used for user interaction.

Log

A Log is a sequence of messages that result when an application executes a task.

Message Data Type

The message data type MaintenanceRequestImportanceCodeByTypeCodeQueryMessage_sync contains the Selection included in the business document. FIG. 289 shows a MaintenanceRequestImportanceCodeByTypeCodeQueryMessage_sync 28900 package. The MaintenanceRequestImportanceCodeByTypeCodeQueryMessage_sync 28900 package is a MaintenanceRequestImportanceCodeByTypeCodeQueryMessage_sync 28904 datatype. The MaintenanceRequestImportanceCodeByTypeCodeQueryMessage_sync 28900 package includes a MaintenanceRequestImportanceCodeByTypeCodeQueryMessage_sync 28902 entity. The MaintenanceRequestImportanceCodeByTypeCodeQueryMessage_sync 28900 package includes a Selection 28906 package.

The Selection 28906 package includes a MaintenanceRequestImportanceCodeByTypeCode 28908 entity.

The MaintenanceRequestImportanceCodeByTypeCode 28908 entity has a cardinality of one 28910 meaning that for each instance of the MaintenanceRequestImportanceCodeByTypeCodeQueryMessage_sync 28902 entity there is one MaintenanceRequestImportanceCodeByTypeCode 28908 entity. The MaintenanceRequestImportanceCodeByTypeCode 28908 entity includes a MaintenanceRequestTypeCode 28912 attribute.

The MaintenanceRequestTypeCode 28912 attribute is a MaintenanceRequestTypeCode 28916 datatype. The MaintenanceRequestTypeCode 28912 attribute has a cardinality of one 28914 meaning that for each instance of the MaintenanceRequestImportanceCodeByTypeCode 28908 entity there is one MaintenanceRequestTypeCode 28912 attribute.

Selection Package

The Selection package collects all the selection criteria.

MaintenanceRequestImportanceCodeSelectionByTypeCode

MaintenanceRequestTypeCode refers to a coded representation of type of maintenance request.

Message Data Type

The message data type MaintenanceRequestImportanceCodeByTypeCodeResponseMessage_sync contains the Maintenance Request included in the business document. FIG. 290 shows a MaintenanceRequestImportanceCodeByTypeCodeResponseMessage_sync 29000 package. The MaintenanceRequestImportanceCodeByTypeCodeResponseMessage_sync 29000 package is a MaintenanceRequestImportanceCodeByTypeCodeResponseMessage__sync 29004 datatype.

The MaintenanceRequestImportanceCodeByTypeCodeResponseMessage_sync 29000 package includes a MaintenanceRequestImportanceCodeByTypeCodeResponseMessage_sync 29002 entity. The MaintenanceRequestImportanceCodeByTypeCodeResponseMessage_sync 29000 package includes various packages, namely MaintenanceRequest 29006 and Log 29024.

The MaintenanceRequest 29006 package includes a MaintenanceRequestImportanceCode 29008 entity.

The MaintenanceRequestImportanceCode 29008 entity has a cardinality of zero or n 29010 meaning that for each instance of the MaintenanceRequestImportanceCodeByTypeCodeResponseMessage_sync 29002 entity there may be one or more MaintenanceRequestImportanceCode 29008 entities. The MaintenanceRequestImportanceCode 29008 entity includes various attributes, namely Code 29012 and Name 29018.

The Code 29012 attribute is an ImportanceCode 29016 datatype. The Code 29012 attribute has a cardinality of one 29014 meaning that for each instance of the MaintenanceRequestImportanceCode 29008 entity there is one Code 29012 attribute.

The Name 29018 attribute is a LEN20_Name 29022 datatype. The Name 29018 attribute has a cardinality of zero or one 29020 meaning that for each instance of the MaintenanceRequestImportanceCode 29008 entity there may be one Name 29018 attribute.

The Log 29024 package is a Log 29030 datatype. The Log 29024 package includes a Log 29026 entity.

The Log 29026 entity has a cardinality of one 29028 meaning that for each instance of the MaintenanceRequestImportanceCodeByTypeCodeResponseMessage_sync 29002 entity there is one Log 29026 entity.

MaintenanceRequest Interfaces

In certain implementations, system 100 may implement or facilitate a computer-implemented method for managing maintenance requests. This method may include generating a first electronic message by a first application, the first application executing in an environment of computer systems providing message-based services, where the first message requests creation of a maintenance order and comprises a maintenance order package that includes an operation package, a party package, and a cost settle rule package. The method may also include receiving a second electronic message from a second application in response to transmission of the first message, the second application executing in the environment of computer systems providing message-based services, where the second message comprises the maintenance order package that includes the operation package, the party package, and the cost settle rule package. The example method further includes i) generating a third electronic message by the first application, where the third message requests a status of the maintenance order and comprises the maintenance order package that includes the operation package, the party package, and the cost settle rule package; and ii) receiving a fourth electronic message from the second application in response to transmission of the third message, where the fourth message provides a status and comprises the maintenance order package that includes the operation package, the party package, and the cost settle rule package. If the particular maintenance order is changed, the method may include i) generating a fifth electronic message by the first application, where the fifth message requests that the particular maintenance order be changed and comprises the maintenance order package; and ii) receiving a sixth electronic message from the second application in response to transmission of the fifth message, where the sixth message confirms the change and comprises the maintenance order package. And if the particular maintenance order is cancelled, the method may include i) generating a fifth electronic message by the first application, where the fifth message requests that the particular maintenance order be cancelled and comprises the maintenance order package; and ii) receiving a sixth electronic message from the second application in response to transmission of the fifth message, where the sixth message confirms the cancellation and comprises the maintenance order package.

MaintenanceRequest

MaintenanceRequest specifies the list of allowed importance codes for a maintenance request type. ImportanceCode refers to a coded representation of the importance allowed for a maintenance request type. ImportanceName (may be optional) refers to a name of the maintenance request importance code.

Log Package

A Log package groups the error messages used for user interaction

Log

A Log is a sequence of messages that result when an application executes a task.

Message Data Type

FIGS. 269-1 through 269-2 show a MaintenanceRequestAllowedActivityGroupAndActivityByElementsQueryMessage_sync 26900 package. The MaintenanceRequestAllowedActivityGroupAndActivityByElementsQueryMessage_sync 26900 package is a MaintenanceRequestAllowedActivityGroupAndActivityByElementsQueryMessage_sync 26904 datatype. The MaintenanceRequestAllowedActivityGroupAndActivityByElementsQueryMessage_sync 26900 package includes a MaintenanceRequestAllowedActivityGroupAndActivityByElementsQueryMessage_sync 26902 entity. The MaintenanceRequestAllowedActivityGroupAndActivityByElementsQueryMessage_sync 26900 package includes a Selection 26906 package.

The Selection 26906 package includes a MaintenanceRequestAllowedActivityGroupAndActivitySelectionByElements 26908 entity.

The MaintenanceRequestAllowedActivityGroupAndActivitySelectionByElements 26908 entity has a cardinality of one 26910 meaning that for each instance of the MaintenanceRequestAllowedActivityGroupAndActivityByElementsQueryMessage_sync 26902 entity there is one MaintenanceRequestAllowedActivityGroupAndActivitySelectionByElements 26908 entity. The MaintenanceRequestAllowedActivityGroupAndActivitySelectionByElements 26908 entity includes various attributes, namely MaintenanceRequestTypeCode 26912, MaintenanceRequestInstallationPointID 26918 and MaintenanceRequestIndividualMaterialID 26924.

The MaintenanceRequestTypeCode 26912 attribute is a MaintenanceRequestTypeCode 26916 datatype. The MaintenanceRequestTypeCode 26912 attribute has a cardinality of one 26914 meaning that for each instance of the MaintenanceRequestAllowedActivityGroupAndActivitySelectionByElements 26908 entity there is one MaintenanceRequestTypeCode 26912 attribute.

The MaintenanceRequestInstallationPointID 26918 attribute is an InstallationPointID 26922 datatype. The MaintenanceRequestInstallationPointID 26918 attribute has a cardinality of zero or one 26920 meaning that for each instance of the MaintenanceRequestAllowedActivityGroupAndActivitySelectionByElements 26908 entity there may be one MaintenanceRequestInstallationPointID 26918 attribute.

The MaintenanceRequestIndividualMaterialID 26924 attribute is a ProductInternalID 26928 datatype. The MaintenanceRequestIndividualMaterialID 26924 attribute has a cardinality of zero or one 26926 meaning that for each instance of the MaintenanceRequestAllowedActivityGroupAndActivitySelectionByElements 26908 entity there may be one MaintenanceRequestIndividualMaterialID 26924 attribute.

Message Data Type

FIGS. 270-1 through 270-2 show a MaintenanceRequestAllowedActivityGroupAndActivityByElementsResponseMessage_sync 27000 package. The MaintenanceRequestAllowedActivityGroupAndActivityByElementsResponseMessage_sync 27000 package is a MaintenanceRequestAllowedActivityGroupAndActivityBy ElementsResponseMessage_sync 27004 datatype. The MaintenanceRequestAllowedActivityGroupAndActivityByElementsResponseMessage_sync 27000 package includes a MaintenanceRequestAllowedActivityGroupAndActivityByElementsResponseMessage_sync 27002 entity. The MaintenanceRequestAllowedActivityGroupAndActivityBy ElementsResponseMessage_sync 27000 package includes various packages, namely MaintenanceRequest 27006 and Log 27036.

The MaintenanceRequest 27006 package includes a MaintenanceRequestAllowedActivityGroupAndActivity 27008 entity.

The MaintenanceRequestAllowedActivityGroupAndActivity 27008 entity has a cardinality of one 27010 meaning that for each instance of the MaintenanceRequestAllowedActivityGroupAndActivityByElementsResponseMessage_sync 27002 entity there is one MaintenanceRequestAllowedActivityGroupAndActivity 27008 entity. The MaintenanceRequestAllowedActivityGroupAndActivity 27008 entity includes various attributes, namely ActivityGroupCode 27012, ActivityGroupName 27018, ActivityCode 27024 and ActivityName 27030.

The ActivityGroupCode 27012 attribute is a MaintenanceRequestActivityGroupCode 27016 datatype. The ActivityGroupCode 27012 attribute has a cardinality of one 27014 meaning that for each instance of the MaintenanceRequestAllowedActivityGroupAndActivity 27008 entity there is one ActivityGroupCode 27012 attribute.

The ActivityGroupName 27018 attribute is a MEDIUM_Name 27022 datatype. The ActivityGroupName 27018 attribute has a cardinality of zero or one 27020 meaning that for each instance of the MaintenanceRequestAllowedActivityGroupAndActivity 27008 entity there may be one ActivityGroupName 27018 attribute.

The ActivityCode 27024 attribute is a MaintenanceRequestActivityCode 27028 datatype. The ActivityCode 27024 attribute has a cardinality of one 27026 meaning that for each instance of the MaintenanceRequestAllowedActivityGroupAndActivity 27008 entity there is one ActivityCode 27024 attribute.

The ActivityName 27030 attribute is a MEDIUM_Name 27034 datatype. The ActivityName 27030 attribute has a cardinality of zero or one 27032 meaning that for each instance of the MaintenanceRequestAllowedActivityGroupAndActivity 27008 entity there may be one ActivityName 27030 attribute.

The Log 27036 package is a Log 27042 datatype. The Log 27036 package includes a Log 27038 entity.

The Log 27038 entity has a cardinality of one 27040 meaning that for each instance of the MaintenanceRequestAllowedActivityGroupAndActivityByElementsResponseMessage_sync 27002 entity there is one Log 27038 entity.

Message Data Type

FIGS. 271-1 through 271-2 show a MaintenanceRequestAllowedIssueCauseGroupAndIssueCauseByElementsQueryMessage_sync 27100 package. The MaintenanceRequestAllowedIssueCauseGroupAndIssueCauseByElementsQueryMessage_sync 27100 package is a MaintenanceRequestAllowedIssueCauseGroupAndIssueCause ByElementsQueryMessage_sync 27104 datatype. The MaintenanceRequestAllowedIssueCauseGroupAndIssueCauseByElementsQueryMessage_sync 27100 package includes a MaintenanceRequestAllowedIssueCauseGroupAndIssueCauseByElementsQueryMessage_sync 27102 entity. The MaintenanceRequestAllowedIssueCauseGroupAndIssueCause ByElementsQueryMessage_sync 27100 package includes a Selection 27106 package.

The Selection 27106 package includes a MaintenanceRequestAllowedIssueCauseGroupAndIssueCauseSelectionByElements 27108 entity.

The MaintenanceRequestAllowedIssueCauseGroupAndIssueCauseSelectionByElements 27108 entity has a cardinality of one 27110 meaning that for each instance of the MaintenanceRequestAllowedIssueCauseGroupAndIssueCauseByElementsQueryMessage_sync 27102 entity there is one MaintenanceRequestAllowedIssueCauseGroupAndIssueCauseSelectionByElements 27108 entity. The MaintenanceRequestAllowedIssueCauseGroupAndIssueCauseSelectionByElements 27108 entity includes various attributes, namely MaintenanceRequestTypeCode 27112, MaintenanceRequestInstallationPointID 27118 and MaintenanceRequestIndividualMaterialID 27124.

The MaintenanceRequestTypeCode 27112 attribute is a MaintenanceRequestTypeCode 27116 datatype. The MaintenanceRequestTypeCode 27112 attribute has a cardinality of one 27114 meaning that for each instance of the MaintenanceRequestAllowedIssueCauseGroupAndIssueCauseSelectionByElements 27108 entity there is one MaintenanceRequestTypeCode 27112 attribute.

The MaintenanceRequestInstallationPointID 27118 attribute is an InstallationPointID 27122 datatype. The MaintenanceRequestInstallationPointID 27118 attribute has a cardinality of zero or one 27120 meaning that for each instance of the MaintenanceRequestAllowedIssueCauseGroupAndIssueCauseSelectionByElements 27108 entity there may be one MaintenanceRequestInstallationPointID 27118 attribute.

The MaintenanceRequestIndividualMaterialID 27124 attribute is a ProductInternalID 27128 datatype. The MaintenanceRequestIndividualMaterialID 27124 attribute has a cardinality of zero or one 27126 meaning that for each instance of the MaintenanceRequestAllowedIssueCauseGroupAndIssueCauseSelectionByElements 27108 entity there may be one MaintenanceRequestIndividualMaterialID 27124 attribute.

Message Data Type

FIGS. 271-1 through 271-2 show a MaintenanceRequestAllowedIssueCauseGroupAndIssueCauseByElementsResponseMessage_sync 27100 package. The MaintenanceRequest AllowedIssueCauseGroupAndIssueCauseByElementsResponseMessage_sync 27100 package is a MaintenanceRequestAllowedIssueCauseGroupAndIssueCauseByElementsResponse Message_sync 27104 datatype. The MaintenanceRequestAllowedIssueCauseGroupAndIssueCauseByElementsResponseMessage_sync 27100 package includes a MaintenanceRequestAllowedIssueCauseGroupAndIssueCauseByElementsResponseMessage_sync 27102 entity. The MaintenanceRequestAllowedIssueCauseGroupAndIssueCauseByElementsResponseMessage__sync 27100 package includes various packages, namely MaintenanceRequest 27106 and Log 27136.

The MaintenanceRequest 27106 package includes a MaintenanceRequestAllowedIssueCauseGroupAndIssueCause 27108 entity.

The MaintenanceRequestAllowedIssueCauseGroupAndIssueCause 27108 entity has a cardinality of zero or n 27110 meaning that for each instance of the MaintenanceRequestAllowedIssueCauseGroupAndIssueCauseByElementsResponseMessage_sync 27102 entity there may be one or more MaintenanceRequestAllowedIssueCauseGroupAndIssueCause 27108 entities. The MaintenanceRequestAllowedIssueCauseGroupAndIssueCause 27108 entity includes various attributes, namely IssueCauseGroupCode 27112, IssueCauseGroupName 27118, IssueCauseCode 27124 and IssueCauseName 27130.

The IssueCauseGroupCode 27112 attribute is a MaintenanceRequestIssueCauseGroupCode 27116 datatype. The IssueCauseGroupCode 27112 attribute has a cardinality of one 27114 meaning that for each instance of the MaintenanceRequestAllowedIssueCauseGroupAndIssueCause 27108 entity there is one IssueCauseGroupCode 27112 attribute.

The IssueCauseGroupName 27118 attribute is a MEDIUM_Name 27122 datatype. The IssueCauseGroupName 27118 attribute has a cardinality of zero or one 27120 meaning that for each instance of the MaintenanceRequestAllowedIssueCauseGroupAndIssueCause 27108 entity there may be one IssueCauseGroupName 27118 attribute.

The IssueCauseCode 27124 attribute is a MaintenanceRequestIssueCauseCode 27128 datatype. The IssueCauseCode 27124 attribute has a cardinality of one 27126 meaning that for each instance of the MaintenanceRequestAllowedIssueCauseGroupAndIssueCause 27108 entity there is one IssueCauseCode 27124 attribute.

The IssueCauseName 27130 attribute is a MEDIUM_Name 27134 datatype. The IssueCauseName 27130 attribute has a cardinality of zero or one 27132 meaning that for each instance of the MaintenanceRequestAllowedIssueCauseGroupAndIssueCause 27108 entity there may be one IssueCauseName 27130 attribute.

The Log 27136 package is a Log 27142 datatype. The Log 27136 package includes a Log 27138 entity.

The Log 27138 entity has a cardinality of one 27140 meaning that for each instance of the MaintenanceRequestAllowedIssueCauseGroupAndIssueCauseByElementsResponseMessage_sync 27102 entity there is one Log 27138 entity.

Message Data Type

FIGS. 272-1 through 272-2 show a MaintenanceRequestAllowedIssueGroupAndIssueByElementsQueryMessage_sync 27200 package. The MaintenanceRequestAllowedIssueGroupAndIssueBy ElementsQueryMessage_sync 27200 package is a MaintenanceRequestAllowedIssueGroupAndIssueByElementsQueryMessage_sync 27204 datatype. The MaintenanceRequestAllowedIssueGroupAndIssueByElementsQueryMessage_sync 27200 package includes a MaintenanceRequestAllowedIssueGroupAndIssueByElementsQueryMessage_sync 27202 entity. The MaintenanceRequestAllowedIssueGroupAndIssueByElementsQueryMessage_sync 27200 package includes a Selection 27206 package.

The Selection 27206 package includes a MaintenanceRequestAllowedIssueGroupAndIssueSelectionByElements 27208 entity.

The MaintenanceRequestAllowedIssueGroupAndIssueSelectionByElements 27208 entity has a cardinality of one 27210 meaning that for each instance of the MaintenanceRequestAllowedIssueGroupAndIssueByElementsQueryMessage_sync 27202 entity there is one MaintenanceRequestAllowedIssueGroupAndIssueSelectionByElements 27208 entity. The MaintenanceRequestAllowedIssueGroupAndIssueSelectionByElements 27208 entity includes various attributes, namely MaintenanceRequestTypeCode 27212, MaintenanceRequestInstallationPointID 27218 and MaintenanceRequestIndividualMaterialID 27224.

The MaintenanceRequestTypeCode 27212 attribute is a MaintenanceRequestTypeCode 27216 datatype. The MaintenanceRequestTypeCode 27212 attribute has a cardinality of one 27214 meaning that for each instance of the MaintenanceRequestAllowedIssueGroupAndIssueSelectionByElements 27208 entity there is one MaintenanceRequestTypeCode 27212 attribute.

The MaintenanceRequestInstallationPointID 27218 attribute is an InstallationPointID 27222 datatype. The MaintenanceRequestInstallationPointID 27218 attribute has a cardinality of zero or one 27220 meaning that for each instance of the MaintenanceRequestAllowedIssueGroupAndIssueSelectionByElements 27208 entity there may be one MaintenanceRequestInstallationPointID 27218 attribute.

The MaintenanceRequestIndividualMaterialID 27224 attribute is a ProductInternalID 27228 datatype. The MaintenanceRequestIndividualMaterialID 27224 attribute has a cardinality of zero or one 27226 meaning that for each instance of the MaintenanceRequestAllowedIssueGroupAndIssueSelectionByElements 27208 entity there may be one MaintenanceRequestIndividualMaterialID 27224 attribute.

Message Data Type

FIGS. 273-1 through 273-2 show a MaintenanceRequestAllowedIssueGroupAndIssueByElementsResponseMessage_sync 27300 package. The MaintenanceRequestAllowedIssueGroupAndIssueByElementsResponseMessage_sync 27300 package is a MaintenanceRequestAllowedIssueGroupAndIssueByElementsResponseMessage_sync 27304 datatype. The MaintenanceRequestAllowedIssueGroupAndIssueByElementsResponseMessage_sync 27300 package includes a MaintenanceRequestAllowedIssueGroupAndIssueByElementsResponseMessage_sync 27302 entity. The MaintenanceRequestAllowedIssueGroupAndIssueByElementsResponseMessage_sync 27300 package includes various packages, namely MaintenanceRequest 27306 and Log 27336.

The MaintenanceRequest 27306 package includes a MaintenanceRequestAllowedIssueGroupAndIssue 27308 entity.

The MaintenanceRequestAllowedIssueGroupAndIssue 27308 entity has a cardinality of zero or n 27310 meaning that for each instance of the MaintenanceRequestAllowedIssueGroupAndIssueByElementsResponseMessage_sync 27302 entity there may be one or more MaintenanceRequestAllowedIssueGroupAndIssue 27308 entities. The MaintenanceRequestAllowedIssueGroupAndIssue 27308 entity includes various attributes, namely IssueGroupCode 27312, IssueGroupName 27318, IssueCode 27324 and IssueName 27330.

The IssueGroupCode 27312 attribute is a MaintenanceRequestIssueGroupCode 27316 datatype. The IssueGroupCode 27312 attribute has a cardinality of one 27314 meaning that for each instance of the MaintenanceRequestAllowedIssueGroupAndIssue 27308 entity there is one IssueGroupCode 27312 attribute.

The IssueGroupName 27318 attribute is a MEDIUM_Name 27322 datatype. The IssueGroupName 27318 attribute has a cardinality of zero or one 27320 meaning that for each instance of the MaintenanceRequestAllowedIssueGroupAndIssue 27308 entity there may be one IssueGroupName 27318 attribute.

The IssueCode 27324 attribute is a MaintenanceRequestIssueCode 27328 datatype. The IssueCode 27324 attribute has a cardinality of one 27326 meaning that for each instance of the MaintenanceRequestAllowedIssueGroupAndIssue 27308 entity there is one IssueCode 27324 attribute.

The IssueName 27330 attribute is a MEDIUM_Name 27334 datatype. The IssueName 27330 attribute has a cardinality of zero or one 27332 meaning that for each instance of the MaintenanceRequestAllowedIssueGroupAndIssue 27308 entity there may be one IssueName 27330 attribute.

The Log 27336 package is a Log 27342 datatype. The Log 27336 package includes a Log 27338 entity.

The Log 27338 entity has a cardinality of one 27340 meaning that for each instance of the MaintenanceRequestAllowedIssueGroupAndIssueByElementsResponseMessage_sync 27302 entity there is one Log 27338 entity.

Message Data Type

FIGS. 274-1 through 274-2 show a MaintenanceRequestAllowedProductPartGroupAndProductPartByElementsQueryMessage_sync 27400 package. The MaintenanceRequestAllowedProductPartGroupAndProductPartByElementsQueryMessage_sync 27400 package is a MaintenanceRequestAllowedProductPartGroupAndProduct PartByElementsQueryMessage_sync 27404 datatype. The MaintenanceRequestAllowedProductPartGroupAndProductPartByElementsQueryMessage_sync 27400 package includes a MaintenanceRequestAllowedProductPartGroupAndProductPartByElementsQueryMessage_sync 27402 entity. The MaintenanceRequestAllowedProductPartGroupAndProduct PartByElementsQueryMessage_sync 27400 package includes a Selection 27406 package.

The Selection 27406 package includes a MaintenanceRequestAllowedProductPartGroupAndProductPartSelectionByElements 27408 entity.

The MaintenanceRequestAllowedProductPartGroupAndProductPartSelectionByElements 27408 entity has a cardinality of one 27410 meaning that for each instance of the MaintenanceRequestAllowedProductPartGroupAndProductPartByElementsQueryMessage_sync 27402 entity there is one MaintenanceRequestAllowedProductPartGroupAndProductPartSelectionByElements 27408 entity. The MaintenanceRequestAllowedProductPartGroupAndProductPartSelectionByElements 27408 entity includes various attributes, namely MaintenanceRequestTypeCode 27412, MaintenanceRequestInstallationPointID 27418 and MaintenanceRequestIndividualMaterialID 27424.

The MaintenanceRequestTypeCode 27412 attribute is a MaintenanceRequestTypeCode 27416 datatype. The MaintenanceRequestTypeCode 27412 attribute has a cardinality of one 27414 meaning that for each instance of the MaintenanceRequestAllowedProductPartGroupAndProductPartSelectionByElements 27408 entity there is one MaintenanceRequestTypeCode 27412 attribute.

The MaintenanceRequestInstallationPointID 27418 attribute is an InstallationPointID 27422 datatype. The MaintenanceRequestInstallationPointID 27418 attribute has a cardinality of zero or one 27420 meaning that for each instance of the MaintenanceRequestAllowedProductPartGroupAndProductPartSelectionByElements 27408 entity there may be one MaintenanceRequestInstallationPointID 27418 attribute.

The MaintenanceRequestIndividualMaterialID 27424 attribute is a ProductInternalID 27428 datatype. The MaintenanceRequestIndividualMaterialID 27424 attribute has a cardinality of zero or one 27426 meaning that for each instance of the MaintenanceRequestAllowedProductPartGroupAndProductPartSelectionByElements 27408 entity there may be one MaintenanceRequestIndividualMaterialID 27424 attribute.

Message Data Type

FIGS. 275-1 through 275-2 show a MaintenanceRequestAllowedProductPartGroupAndProductPartByElementsResponseMessage_sync 27500 package. The MaintenanceRequestAllowedProductPartGroupAndProductPartByElementsResponseMessage__sync 27500 package is a MaintenanceRequestAllowedProductPartGroupAndProductPartByElementsResponseMessage_sync 27504 datatype. The MaintenanceRequestAllowedProductPartGroupAndProductPartByElementsResponseMessage_sync 27500 package includes a MaintenanceRequestAllowedProductPartGroupAndProductPartByElementsResponseMessage_sync 27502 entity. The MaintenanceRequestAllowedProductPartGroupAndProductPartByElementsResponseMessage_sync 27500 package includes various packages, namely MaintenanceRequest 27506 and Log 27536.

The MaintenanceRequest 27506 package includes a MaintenanceRequestAllowedProductPartGroupAndProductPart 27508 entity.

The MaintenanceRequestAllowedProductPartGroupAndProductPart 27508 entity has a cardinality of zero or n 27510 meaning that for each instance of the MaintenanceRequestAllowedProductPartGroupAndProductPart- ByElementsResponseMessage_sync 27502 entity there may be one or more MaintenanceRequestAllowedProductPartGroupAndProductPart 27508 entities. The MaintenanceRequestAllowedProductPartGroupAndProductPart 27508 entity includes various attributes, namely ProductPartGroupCode 27512, ProductPartGroupName 27518, ProductPartCode 27524 and ProductPartName 27530.

The ProductPartGroupCode 27512 attribute is a MaintenanceRequestProductPartGroupCode 27516 datatype. The ProductPartGroupCode 27512 attribute has a cardinality of one 27514 meaning that for each instance of the MaintenanceRequestAllowedProductPartGroupAndProductPart 27508 entity there is one ProductPartGroupCode 27512 attribute.

The ProductPartGroupName 27518 attribute is a MEDIUM_Name 27522 datatype. The ProductPartGroupName 27518 attribute has a cardinality of zero or one 27520 meaning that for each instance of the MaintenanceRequestAllowedProductPartGroupAndProductPart 27508 entity there may be one ProductPartGroupName 27518 attribute.

The ProductPartCode 27524 attribute is a MaintenanceRequestProductPartCode 27528 datatype. The ProductPartCode 27524 attribute has a cardinality of one 27526 meaning that for each instance of the MaintenanceRequestAllowedProductPartGroupAndProductPart 27508 entity there is one ProductPartCode 27524 attribute.

The ProductPartName 27530 attribute is a MEDIUM_Name 27534 datatype. The ProductPartName 27530 attribute has a cardinality of zero or one 27532 meaning that for each instance of the MaintenanceRequestAllowedProductPartGroupAndProductPart 27508 entity there may be one ProductPartName 27530 attribute.

The Log 27536 package is a Log 27542 datatype. The Log 27536 package includes a Log 27538 entity.

The Log 27538 entity has a cardinality of one 27540 meaning that for each instance of the MaintenanceRequestAllowedProductPartGroupAndProductPartByElementsResponseMessage_sync 27502 entity there is one Log 27538 entity.

Message Data Type

FIGS. 276-1 through 276-2 show a MaintenanceRequestAllowedTaskGroupAndTaskByElementsQueryMessage_sync 27600 package. The MaintenanceRequestAllowedTaskGroupAndTaskByElements QueryMessage_sync 27600 package is a MaintenanceRequestAllowedTaskGroupAndTaskByElementsQueryMessage_sync 27604 datatype. The MaintenanceRequestAllowedTaskGroupAndTaskByElements QueryMessage_sync 27600 package includes a MaintenanceRequestAllowedTaskGroupAndTaskByElementsQueryMessage_sync 27602 entity. The MaintenanceRequestAllowedTaskGroupAndTaskByElementsQueryMessage_sync 27600 package includes a Selection 27606 package.

The Selection 27606 package includes a MaintenanceRequestAllowedTaskGroupAndTaskSelectionByElements 27608 entity.

The MaintenanceRequestAllowedTaskGroupAndTaskSelectionByElements 27608 entity has a cardinality of one 27610 meaning that for each instance of the MaintenanceRequestAllowedTaskGroupAndTaskByElementsQueryMessage_sync 27602 entity there is one MaintenanceRequestAllowedTaskGroupAndTaskSelectionByElements 27608 entity. The MaintenanceRequestAllowedTaskGroupAndTaskSelectionByElements 27608 entity includes various attributes, namely MaintenanceRequestTypeCode 27612, MaintenanceRequestInstallationPointID 27618 and MaintenanceRequestIndividualMaterialID 27624.

The MaintenanceRequestTypeCode 27612 attribute is a MaintenanceRequestTypeCode 27616 datatype. The MaintenanceRequestTypeCode 27612 attribute has a cardinality of one 27614 meaning that for each instance of the MaintenanceRequestAllowedTaskGroupAndTaskSelectionByElements 27608 entity there is one MaintenanceRequestTypeCode 27612 attribute.

The MaintenanceRequestInstallationPointID 27618 attribute is an InstallationPointID 27622 datatype. The MaintenanceRequestInstallationPointID 27618 attribute has a cardinality of zero or one 27620 meaning that for each instance of the MaintenanceRequestAllowedTaskGroupAndTaskSelectionByElements 27608 entity there may be one MaintenanceRequestInstallationPointID 27618 attribute.

The MaintenanceRequestIndividualMaterialID 27624 attribute is a ProductInternalID 27628 datatype. The MaintenanceRequestIndividualMaterialID 27624 attribute has a cardinality of zero or one 27626 meaning that for each instance of the MaintenanceRequestAllowedTaskGroupAndTaskSelectionByElements 27608 entity there may be one MaintenanceRequestIndividualMaterialID 27624 attribute.

Message Data Type

FIGS. 277-1 through 277-2 show a MaintenanceRequestAllowedTaskGroupAndTaskByElementsResponseMessage_sync 27700 package. The MaintenanceRequestAllowedTaskGroupAndTaskByElements ResponseMessage_sync 27700 package is a MaintenanceRequestAllowedTaskGroupAndTaskByElementsResponseMessage_sync 27704 datatype. The MaintenanceRequestAllowedTaskGroupAndTaskByElementsResponseMessage_sync 27700 package includes a MaintenanceRequestAllowedTaskGroupAndTaskByElementsResponseMessage_sync 27702 entity. The MaintenanceRequestAllowedTaskGroupAndTaskByElementsResponseMessage_sync 27700 package includes various packages, namely MaintenanceRequest 27706 and Log 27736.

The MaintenanceRequest 27706 package includes a MaintenanceRequestAllowedTaskGroupAndTask 27708 entity.

The MaintenanceRequestAllowedTaskGroupAndTask 27708 entity has a cardinality of zero or n 27710 meaning that for each instance of the MaintenanceRequestAllowedTaskGroupAndTaskByElementsResponseMessage_sync 27702 entity there may be one or more MaintenanceRequestAllowedTaskGroupAndTask 27708 entities. The MaintenanceRequestAllowedTaskGroupAndTask 27708 entity includes various attributes, namely TaskGroupCode 27712, TaskGroupName 27718, TaskCode 27724 and TaskName 27730.

The TaskGroupCode 27712 attribute is a MaintenanceRequestTaskGroupCode 27716 datatype. The TaskGroupCode 27712 attribute has a cardinality of one 27714 meaning that for each instance of the MaintenanceRequestAllowedTaskGroupAndTask 27708 entity there is one TaskGroupCode 27712 attribute.

The TaskGroupName 27718 attribute is a MEDIUM_Name 27722 datatype. The TaskGroupName 27718 attribute has a cardinality of zero or one 27720 meaning that for each instance of the MaintenanceRequestAllowedTaskGroupAndTask 27708 entity there may be one TaskGroupName 27718 attribute.

The TaskCode 27724 attribute is a MaintenanceRequestTaskCode 27728 datatype. The TaskCode 27724 attribute has a cardinality of one 27726 meaning that for each instance of the MaintenanceRequestAllowedTaskGroupAndTask 27708 entity there is one TaskCode 27724 attribute.

The TaskName 27730 attribute is a MEDIUM_Name 27734 datatype. The TaskName 27730 attribute has a cardinality of zero or one 27732 meaning that for each instance of the MaintenanceRequestAllowedTaskGroupAndTask 27708 entity there may be one TaskName 27730 attribute.

The Log 27736 package is a Log 27742 datatype. The Log 27736 package includes a Log 27738 entity.

The Log 27738 entity has a cardinality of one 27740 meaning that for each instance of the MaintenanceRequestAllowedTaskGroupAndTaskByElementsResponseMessage_sync 27702 entity there is one Log 27738 entity.

Message Data Type

FIG. 284 shows a MaintenanceRequestChangeStatusMessage 28400 package. The MaintenanceRequestChangeStatusMessage 28400 package is a MaintenanceRequestChangeStatusMessage 28404 datatype. The MaintenanceRequestChangeStatusMessage 28400 package includes a MaintenanceRequestChangeStatusMessage 28402 entity. The MaintenanceRequestChangeStatusMessage 28400 package includes various packages, namely MessageHeader 28406, MaintenanceRequest 28414 and Log 28426.

The MessageHeader 28406 package is a BasicBusinessDocumentMessageHeader 28412 datatype. The MessageHeader 28406 package includes a MessageHeader 28408 entity.

The MessageHeader 28408 entity has a cardinality of zero or one 28410 meaning that for each instance of the MaintenanceRequestChangeStatusMessage 28402 entity there may be one MessageHeader 28408 entity.

The MaintenanceRequest 28414 package includes a MaintenanceRequest 28416 entity.

The MaintenanceRequest 28416 entity has a cardinality of zero or one 28418 meaning that for each instance of the MaintenanceRequestChangeStatusMessage 28402 entity there may be one MaintenanceRequest 28416 entity. The MaintenanceRequest 28416 entity includes an ID 28420 attribute.

The ID 28420 attribute is a MaintenanceRequestID 28424 datatype. The ID 28420 attribute has a cardinality of one 28422 meaning that for each instance of the MaintenanceRequest 28416 entity there is one ID 28420 attribute.

The Log 28426 package is a Log 28432 datatype. The Log 28426 package includes a Log 28428 entity.

The Log 28428 entity has a cardinality of one 28430 meaning that for each instance of the MaintenanceRequestChangeStatusMessage 28402 entity there is one Log 28428 entity.

ManagementControlAssessment Interfaces

Within the Management of Internal Controls not only the documentation of all existing controls within one company is requested, but also to test and assess the completeness and correctness of those controls. For permanent controls that do not belong to a single business process the assessment of those so called management controls can be processed via self service in an external system.

Message Choreography

The message choreography of FIG. 295 describes a possible logical sequence of messages that can be used to realize a management control assessment business scenario.

A ManagementControlAssessmentByIDQuery_sync is the inquiry to the Management of Internal Controls about a management control assessment. The structure of the message type ManagementControlAssessmentByIDQuery_sync is specified by the message data type ManagementControlAssessmentByIDQueryMessage_sync.

A ManagementControlAssessmentByIDResponse_sync is the response to a ManagementControlAssessmentByIDQuery_sync. The structure of the message type ManagementControlAssessmentByIDResponse_sync is specified by the message data type ManagementControlAssessmentByIDResponseMessage_sync.

A ManagementControlAssessmentByElementsQuery_sync is the inquiry to the Management of Internal Controls about management control assessments, selected by elements. The structure of the message type ManagementControlAssessmentByElementsQuery__sync is specified by the message data type ManagementControlAssessmentByElementsQueryMessage_sync.

A ManagementControlAssessmentByElementsResponse_sync is the response to a ManagementControlAssessmentByElementsQuery_sync. The structure of the message type ManagementControlAssessmentByElementsResponse_sync is specified by the message data type ManagementControlAssessmentByElementsResponseMessage_sync.

A ManagementControlAssessmentChangeRequest_sync is the request to the Management of Internal Controls to change ManagementControlAssessment. The structure of the message type ManagementControlAssessmentChangeRequest_sync is specified by the message data type ManagementControlAssessmentChangeRequestMessage_sync.

A ManagementControlAssessmentChangeConfirmation_sync is the confirmation to a ManagementControlAssessmentChangeRequest_sync. The structure of the message type ManagementControlAssessmentChangeConfirmation_sync is specified by the message data type ManagementControlAssessmentChangeConfirmationMessage_sync.

For example, an "Internal Control Auditor" system 295002 can query management control assessments by ID using the ManagementControlAssessmentByIDQuery_sync message 295006 as shown, for example, in FIG. 298. A "Management of Internal Control" system 295004 can respond to the query using the ManagementControlAssessmentByIDResponse_sync message 295008 as shown, for example, in FIG. 299. The "Internal Control Auditor" system 295002 can query management control assessments by elements using the ManagementControlAssessmentByElementsQuery_sync message 295010 as shown, for example, in FIG. 296. The "Management of Internal Control" system 295004 can respond to the query using the ManagementControlAssessmentByElementsResponse_sync message 295012 as shown, for example, in FIG. 297. The "Internal Control Auditor" system 295002 can request to change a management control assessment using the ManagementControlAssessmentChangeRequest_sync message 295014 as shown, for example, in FIG. 301. The "Management of Internal Control" system 295004 can confirm the change request using the ManagementControlAssessmentChangeConfirmation_sync message 295016 as shown, for example, in FIG. 300.

Message Data Type

The message data type ManagementControlAssessmentByIDQueryMessage_sync 295006 of FIG. 298 contains the Selection included in the business document and the business information that is relevant for sending a business document in a message. The message data type 295006 includes entity ManagementControlAssessmentByIDQueryMessage_sync 298004 and packages MessageHeader 298006 and Selection 298010.

MessageHeader Package

MessageHeader package 298006 groups the business information that is relevant for sending a business document in a message. MessageHeader package 298006 includes MessageHeader entity 298008.

MessageHeader

MessageHeader entity 298008 groups business information from the perspective of the sending application, such as information to identify the business document in a message.

Selection Package

Selection package 298010 collects all the selection criteria for the ManagementControlAssessmentByID selection. Selection package 298010 includes ManagementControlAssessmentSelectionByID entity 298012.

ManagementControlAssessmentSelectionByID

A ManagementControlAssessmentSelectionByID entity 298012 specifies the identifier to select a ManagementControlAssessment.

Message Data Type

The message data type ManagementControlAssessmentByIDResponseMessage_sync 295008 of FIG. 299 contains the ManagementControlAssessment included in the business document and the business information that is relevant for sending a business document in a message. The message data type 295008 includes entity ManagementControlAssessmentByIDResponseMessage_sync 299002 and packages MessageHeader 299004, ManagementControlAssessment 299008, and Log 299016.

MessageHeader Package

MessageHeader package 299004 groups the business information that is relevant for sending a business document in a message. MessageHeader package 299004 includes MessageHeader entity 299006.

MessageHeader

MessageHeader entity 299006 groups business information from the perspective of the sending application, such as information to identify the business document in a message.

ManagementControlAssessment Package

ManagementControlAssessment package 299008 contains the ManagementControlAssessment for a management control. ManagementControlAssessment package 299008 includes ManagementControlAssessment entity 299010 and Attachment package 299012.

ManagementControlAssessment

ManagementControlAssessment entity 299010 is an evaluation under the aspect of internal control. The evaluation comprises the completeness and error-proneness of the management control. An ID is the unique identifier of the ManagementControlAssessment. A ReportingLineUnitID is a unique identifier of an organizational unit. A ReportingLineUnitName is the name of the ReportingLineUnit. The BusinessProcessInternalControlGroupID is the identifier of the internal control business group the management control, for which the assessment has been performed, belongs to. A BusinessProcessInternalControlGroupName is the name of the BusinessProcessInternalControlGroup.

A ManagementControlID is a unique identifier for a ManagementControl. A ManagementControl is an activity with control purpose, which is performed independent from a single business process. Those control actions are located at the management level. The ManagementControlName is the name of the management control. The TimeframeName is the name of the timeframe of the ManagementControlAssessment. TimeframeStartDate defines the start of a time interval or timeframe. TimeframeEndDate defines the end of a time interval or timeframe. The AssessmentDueDate defines the due date of the assessment.

ExecutionDate describes the date of the execution of the Management Control Assessment. TestExecutionDateDate is the execution date of the test of the Management Control Assessment. An InternalControlAssessmentTypeCode is a coded representation of the type of the assessment. An Internal control assessment type is an assessment with specific focus of internal control. The TitleName is the name of the title of the ManagementControlAssessment. An AssessmentInternalControlRatingCode is the coded information of the InternalControlRating. An internal control rating is an assessment classification for an internal control activity or document based on subjective criteria expressed by the traffic lights green, yellow, and red.

The AssessmentInternalControlRatingCodeName is the name of the InternalControlRatingCode. A Note is a natural-language comment on a ManagementControlAssessment. An InternalControlAssessmentLifeCycleStatusCode is a coded representation of the InternalControlAssessmentLifeCycleStatus. The internal control assessment life cycle status is the life cycle status of an internal control assessment in Management of Internal Controls. The InternalControlAssessmentLifeCycleStatusCodeName is the name of the InternalControlAssessmentLifeCycleStatusCode. The InternalControlCarryForwardStatusCode is the coded presentation of the status of the InternalControlCarryForwardStatus. The carry forward status describes the status of internal control issues, assessments, or remediation plans with respect to carry forward from current sign-off period to the next sign-off period. The InternalControlCarryForwardStatusCodeName is the name of the InternalControlCarryForwardStatusCode.

A ManagementControlDescriptionText is a natural-language description of a management control. A ManagementControlAssessmentNote is a natural-language comment on how the assessment of a management control shall be performed. A ManagementControlTestNote is a natural-language comment on how the test of a management control shall be performed. A ValidationNote is a natural-language comment on the validation of the ManagementControlAssessment. An InternalControlIssueRequiredInternalControlRatingCode the coded information of the InternalControlRating for which the creation of an InternalControlIssue is required. An internal control rating is an assessment classification for an internal control activity or document based on subjective criteria expressed by the traffic lights green, yellow, and red. An InternalControlIssueTotalNumberValue is the number of InternalControlIssues.

An Attachment TotalNumberValue is the number of attachments of a total number. A ResponsibleBusinessPartnerInternalID is a unique identifier for the responsible for the ManagementControlAssessment. The ResponsibleName is the complete, formatted name of the responsible for the ManagementControlAssessment. An ApproverBusinessPartnerInternalID is a unique identifier for the approver of the ManagementControlAssessment. The ApproverName is the complete, formatted name for the approver of the ManagementControlAssessment.

Attachment Package

Attachment package 299012 groups all the attributes of an attachment that has been linked to the assessment. Attachment package 299012 includes Attachment entity 299014.

Attachment

Attachment entity 299014 is a document that is attached to the assessment.

Log Package

Log package 299016 groups the error messages used for user interaction. Log package 299016 includes Log entity 299018.

Log

Log entity 299018 is a sequence of messages that result when an application executes a task.

Message Data Type

The message data type ManagementControlAssessmentByElementsQueryMessage_sync 295010 of FIG. 296 contains the Selection included in the business document and the business information that is relevant for sending a business document in a message. The message data type 295010 includes entity ManagementControlAssessmentByElementsQueryMessage_sync 296002 and packages MessageHeader 296004 and Selection 296008.

MessageHeader Package

MessageHeader package 296004 groups the business information that is relevant for sending a business document in a message. MessageHeader package 296004 includes MessageHeader entity 296006.

MessageHeader

MessageHeader entity 296006 groups business information from the perspective of the sending application, for example, information to identify the business document in a message.

Selection Package

Selection package 296008 collects all the selection criteria for the ManagementControlAssessmentQuery. Selection package 296008 includes ManagementControlAssessmentSelectionByElements entity 296010.

ManagementControlAssessmentSelectionByElements

ManagementControlAssessmentSelectionByElements entity 296010 specifies the selection elements to select a ManagementControlAssessment. Within entity 296010, TimeframeStartDate relates to the date that defines the start of a time interval or timeframe. TimeframeEndDate relates to the date that defines the end of a time interval or timeframe. ReportingLineUnit_ID (optional) is a unique identifier of an organizational unit. The ReportingLineUnit contains the organizational unit the ManagementControl may belong to. BusinessProcessInternalControlGroup_ID (optional) is the identifier of the business process internal control group the management control, for which the assessment has been performed, may belong to.

Message Data Type

The message data type ManagementControlAssessmentByElementsResponseMessage_sync 295012 of FIG. 297 contains the ManagementControlAssessment included in the business document and the business information that is relevant for sending a business document in a message. The message data type 295012 includes entity ManagementControlAssessmentByIDResponseMessage_sync 297002 and packages MessageHeader 297004, ManagementControlAssessment 297008, and Log 297016.

MessageHeader Package

MessageHeader package 297004 groups the business information that is relevant for sending a business document in a message. MessageHeader package 297004 groups MessageHeader entity 297006.

MessageHeader

MessageHeader entity 297006 groups business information from the perspective of the sending application, for example, information to identify the business document in a message.

ManagementControlAssessment Package

ManagementControlAssessment package 297008 contains the ManagementControlAssessment for a management control. ManagementControlAssessment package 297008 includes ManagementControlAssessment entity 297010 and Attachment package 297012.

ManagementControlAssessment

ManagementControlAssessment entity 297010 is an evaluation under the aspect of internal control. The evaluation comprises the completeness and error-proneness of the management control.

Log Package

Log package 297016 groups the error messages used for user interaction. Log package 297016 includes Log entity 297018.

Log

Log entity 297018 is a sequence of messages that result when an application executes a task.

Message Data Type

The message data type ManagementControlAssessmentChangeRequestMessage_sync 295014 of FIG. 301 contains the ManagementControlAssessment included in the business document and the business information that is relevant for sending a business document in a message. The message data type 295014 includes entity ManagementControlAssessmentChangeRequestMessage_sync 301002 and packages MessageHeader 301004 and ManagementControlAssessment 301008.

MessageHeader Package

MessageHeader package 301004 groups the business information that is relevant for sending a business document in a message. MessageHeader package 301004 includes MessageHeader entity 301006

MessageHeader

MessageHeader entity 301006 groups business information from the perspective of the sending application. For example, information to identify the business document in a message.

ManagementControlAssessment Package

ManagementControlAssessment package 301008 contains the ManagementControlAssessment for which the request is performed. ManagementControlAssessment package 301008 contains ManagementControlAssessment entity 301010.

ManagementControlAssessment

ManagementControlAssessment entity 301010 is an evaluation under the aspect of internal control. The evaluation comprises the completeness and error-proneness of the management control.

Message Data Type

The message data type ManagementControlAssessmentChangeConfirmationMessage_sync 295016 of FIG. 300 contains, for example, the business information that is relevant for sending a business document in a message. The message data type 295016 includes entity ManagementControlAssessmentChangeConfirmationMessage_sync 300002 and packages MessageHeader 300004 and Log 300008.

MessageHeader Package

MessageHeader package 300004 groups the business information that is relevant for sending a business document in a message. MessageHeader package 300004 includes MessageHeader entity 300006

MessageHeader

MessageHeader entity 300006 groups business information from the perspective of the sending application, for example, information to identify the business document in a message.

Log Package

Log package 300008 groups the error messages used for user interaction. Log package 300008 includes Log entity 300010.

Log

Log entity 300010 is a sequence of messages that result when an application executes a task.

Material Interfaces

All business processes concerning materials—from sales processing to production order processing—need the material identifier. Therefore, in a first step any user who intends to use a material can know its identifier. To this end queries are needed to identify a material from given vague information. In a second step some scenario specific settings for a given material are read.

Message Choreography

The message choreography of FIG. 302 describes a possible logical sequence of messages that can be used to realize a material basic data business scenario.

A MaterialBasicDataByIDQuery_sync is an inquiry to return the detailed information of the basic data of a material with a given ID. The structure of the message type MaterialBasicDataByIDQuery_sync is specified by the message data type MaterialBasicDataByIDQueryMessage_sync.

A MaterialBasicDataByIDResponse_sync is the response to a MaterialBasicDataByIDQuery_sync. The structure of the message type MaterialBasicDataByIDResponse_sync is specified by the message data type MaterialBasicDataByIDResponseMessage_sync.

A MaterialSimpleByIDAndDescriptionQuery_sync is an inquiry for identifying elements of materials matching given patterns of a language-dependent description or material ID. The structure of the message type MaterialSimpleByIDAndDescriptionQuery_sync is specified by the message data type MaterialSimpleByIDAndDescriptionQueryMessage_sync.

A MaterialSimpleByIDAndDescriptionResponse_sync is the response to a MaterialSimpleByIDAndDescriptionQuery_sync. The structure of the message type MaterialSimpleByIDAndDescriptionResponse_sync is specified by the message data type MaterialSimpleByIDAndDescriptionResponseMessage_sync.

A MaterialSimpleByGTINQuery_sync is an inquiry for identifying elements of materials having a given Global Trade Item Number. The structure of the message type MaterialSimpleByGTINQuery__sync is specified by the message data type MaterialSimpleByGTINQueryMessage_sync.

A MaterialSimpleByGTINResponse_sync is the response to a MaterialSimpleByGTINQuery_sync. The structure of the message type MaterialSimpleByGTINResponse_sync is specified by the message data type MaterialSimpleByGTINResponseMessage_sync.

A MaterialSimpleBySearchtextQuery_sync is an inquiry for identifying elements of materials matching a given searchtext. The scope of the search includes searching through all short texts and long texts as well as most attributes of a material. The structure of the message type MaterialSimpleBySearchtextQuery_sync is specified by the message data type MaterialSimpleBySearchtextQueryMessage_sync. Currently the TREX search engine is used for the search using the searchtext.

A MaterialSimpleBySearchtextResponse_sync is the response to a MaterialSimpleBySearchtextQuery_sync. The structure of the message type MaterialSimpleBySearchtextResponse_sync is specified by the message data type MaterialSimpleBySearchtextResponseMessage_sync, which is derived from the message data type MaterialSimpleResponseMessage_sync.

A MaterialSalesSpecificationByIDQuery_sync is an inquiry to return the sales specification information of a material with a given ID. The structure of the message type MaterialSalesSpecificationByIDQuery_sync is specified by the message data type MaterialSalesSpecificationByIDQueryMessage_sync.

A MaterialSalesSpecificationByIDResponse_sync is the response to a MaterialSalesSpecificationByIDQueryMessage_sync. The structure of the message type MaterialSalesSpecificationByIDResponse_sync is specified by the message data type MaterialSalesSpecificationByIDResponseMessage_sync.

A MaterialSalesSpecificationByElementsQuery_sync is an inquiry to return sales specification information of materials for certain selection criteria. The structure of the message type MaterialSalesSpecificationByElementsQuery_sync is specified by the message data type MaterialSalesSpecificationByElementsQueryMessage_sync.

A MaterialSalesSpecificationByElementsResponse_sync is the response to a MaterialSalesSpecificationByElementsQueryMessage_sync. The structure of the message type MaterialSalesSpecificationByElementsResponse_sync is specified by the message data type MaterialSalesSpecificationByElementsResponseMessage_sync.

For example, a "Sales Employee Workshop Employee or Product Line Manager" system 302002 can query material basic data by ID using the MaterialBasicDataByIDQuery_sync message 302006 as shown, for example, in FIG. 303. A "Product Data Processing" system 302004 can respond to the query using the MaterialBasicDataByIDResponse_sync message 302018 as shown, for example, in FIG. 304. The "Sales Employee Workshop Employee or Product Line Manager" system 302002 can query material basic data by ID and description using the MaterialSimpleByIDAndDescriptionQuery_sync message 302008 as shown, for example, in FIG. 310. The "Product Data Processing" system 302004 can respond to the query using the MaterialSimpleByIDAndDescriptionResponse_sync message 302020 as shown, for example, in FIG. 312. The "Sales Employee Workshop Employee or Product Line Manager" system 302002 can query material basic data by GTIN using the MaterialSimpleByGTINQuery_sync message 302010 as shown, for example, in FIG. 309. The "Product Data Processing" system 302004 can respond to the query using the MaterialSimpleByGTINResponse_sync message 302022. The "Sales Employee Workshop Employee or Product Line Manager" system 302002 can query material basic data by search text using the MaterialSimpleBySearchtextQuery_sync message 302012 as shown, for example, in FIG. 311. The "Product Data Processing" system 302004 can respond to the query using the MaterialSimpleBySearchtextResponse_sync message 302024. The "Sales Employee Workshop Employee or Product Line Manager" system 302002 can query material sales specifications by ID using the MaterialSalesSpecificationByIDQuery_sync message 302014 as shown, for example, in FIG. 307. The "Product Data Processing" system 302004 can respond to the query using the MaterialSalesSpecificationByIDResponse_sync message 302026 as shown, for example, in FIG. 308. The "Sales Employee Workshop Employee or Product Line Manager" system 302002 can query material sales specifications by elements using the MaterialSalesSpecificationByElementsQuery_sync message 302016 as shown, for example, in FIG. 305. The "Product Data Processing" system 302004 can respond to the query using the MaterialSalesSpecificationByElementsResponse_sync message 302028 as shown, for example, in FIG. 306.

Message Data Type

The message data type BasicDataByIDQueryMessage_sync contains the Selection included in the business document. It contains the Selection package.

FIG. 313 shows a MaterialBasicDataByIDQueryMessage_sync 313000 package. The MaterialBasicDataByIDQueryMessage_sync 313000 package is a MaterialBasicDataByIDQueryMessage_sync 313004 datatype. The MaterialBasicDataByIDQueryMessage_sync 313000 package includes a MaterialBasicDataByIDQueryMessage_sync 313002 entity. The MaterialBasicDataByIDQueryMessage_sync 313000 package includes a Selection 313006 package.

The Selection 313006 package is a MaterialBasicDataSelectionByID 313012 datatype. The Selection 313006 package includes a MaterialBasicDataSelectionByID 313008 entity.

The MaterialBasicDataSelectionByID 313008 entity has a cardinality of one 313010 meaning that for each instance of the MaterialBasicDataByIDQueryMessage_sync 313002 entity there is one MaterialBasicDataSelectionByID 313008 entity. The MaterialBasicDataSelectionByID 313008 entity includes a MaterialInternalID 313014 attribute.

The MaterialInternalID 313014 attribute is a ProductInternalID 313018 datatype. The MaterialInternalID 313014 attribute has a cardinality of one 313016 meaning that for each instance of the MaterialBasicDataSelectionByID 313008 entity there is one MaterialInternalID 313014 attribute.

Selection Package

The Selection package collects the selection criteria for Material. It contains the MaterialBasicDataSelectionByID entity.

MaterialBasicDataSelectionByID

The MaterialBasicDataSelectionByID specifies a material ID for which to select a material. The MaterialInternalID is a proprietary identifier for a material.

Message Data Type

The message data type MaterialBasicDataByIDResponseMessage_sync contains the Material included in the business document. It contains the Material and Log packages.

FIGS. 314-1 through 314-6 show a MaterialBasicDataByIDResponseMessage_sync 314000 package. The MaterialBasicDataByIDResponseMessage_sync 314000 package is a MaterialBasicDataByIDResponseMessage_sync 314004 datatype. The MaterialBasicDataByIDResponseMessage_sync 314000 package includes a MaterialBasicDataByIDResponseMessage_sync 314002 entity. The MaterialBasicDataByIDResponseMessage_sync 314000 package includes various packages, namely Material 314006 and Log 3140176.

The Material 314006 package is a Material 314012 datatype. The Material 314006 package includes a Material 314008 entity.

The Material 314008 entity has a cardinality of one 314010 meaning that for each instance of the MaterialBasicDataByIDResponseMessage_sync 314002 entity there is one Material 314008 entity. The Material 314008 entity includes various attributes, namely InternalID 314014, TypeCode 314020, IndustrialSectorCode 314026, PreviousName 314032, DeletedIndicator 314038, DivisionCode 314044, DivisionDescription 314050 and Description 314056.

The InternalID 314014 attribute is a ProductInternalID 314018 datatype. The InternalID 314014 attribute has a cardinality of one 314016 meaning that for each instance of the Material 314008 entity there is one InternalID 314014 attribute.

The TypeCode 314020 attribute is a MaterialTypeCode 314024 datatype. The TypeCode 314020 attribute has a cardinality of one 314022 meaning that for each instance of the Material 314008 entity there is one TypeCode 314020 attribute.

The IndustrialSectorCode 314026 attribute is a MaterialIndustrialSectorCode 314030 datatype. The IndustrialSectorCode 314026 attribute has a cardinality of one 314028 meaning that for each instance of the Material 314008 entity there is one IndustrialSectorCode 314026 attribute.

The PreviousName 314032 attribute is a LANGUAGE-INDEPENDENT_MEDIUM_Name 314036 datatype. The PreviousName 314032 attribute has a cardinality of zero or one 314034 meaning that for each instance of the Material 314008 entity there may be one PreviousName 314032 attribute.

The DeletedIndicator 314038 attribute is an Indicator 314042 datatype. The DeletedIndicator 314038 attribute has a cardinality of zero or one 314040 meaning that for each instance of the Material 314008 entity there may be one DeletedIndicator 314038 attribute.

The DivisionCode 314044 attribute is a DivisionCode 314048 datatype. The DivisionCode 314044 attribute has a cardinality of zero or one 314046 meaning that for each instance of the Material 314008 entity there may be one DivisionCode 314044 attribute.

The DivisionDescription 314050 attribute is a LEN20_Description 314054 datatype. The DivisionDescription 314050 attribute has a cardinality of zero or one 314052 meaning that for each instance of the Material 314008 entity there may be one DivisionDescription 314050 attribute.

The Description 314056 attribute is a Description 314060 datatype. The Description 314056 attribute has a cardinality of one or n 314058 meaning that for each instance of the Material 314008 entity there are one or more Description 314056 attributes.

The Log 3140176 package is a Log 3140182 datatype. The Log 3140176 package includes a Log 3140178 entity.

The Log 3140178 entity has a cardinality of zero or one 3140180 meaning that for each instance of the MaterialBasicDataByIDResponseMessage_sync 314002 entity there may be one Log 3140178 entity.

Material Package

The Material package groups the Material information. It contains at least one Material entity.

Material

A material is a tangible product that can be created and then represents a business value. Its creation/production is independent of its sale and consumption/use in terms of time. A material can be traded, used in manufacture, consumed, or produced. InternalID is a MaterialInternalID is a proprietary identifier for a material. The MaterialTypeCode is the encoded representation of the material type. The MaterialIndustrialSectorCode is the encoded representation of the material industrial sector. The PreviousName is the name of the previous material, e.g. from another system. The DeletedIndicator indicates whether an object has been logically deleted or not. If it is filled, then the material is marked for deletion. A DivisionCode is the coded representation of a division. A division defines the responsibility for sales or profits for salable materials. DivisionDescription is the description of the division Description Description is a language-dependent description of the material. Description is the natural-language representation of the properties of a material.

GlobalTradeItemNumber

GlobalTradeItemNumber is an alternative ID following the EAN-UCC system. GlobalTradeItemNumber is specified with respect to a quantity unit for the material. ProductStandardID is a standardized identifier for a product, and the identification scheme is managed by an agency from the code list DE 3055. The MeasureUnitCode is the coded representation of a non-monetary unit of measurement.

QuantityUnit

QuantityUnit specifies the quantity unit for the Material in which the Material can be measured or in which it is available within a company. The Quantity is the non-monetary numerical specification of an amount in a unit of measurement. The material can be measured and is available within a company with this quantity. The MaterialBaseQuantity is the non-monetary numerical specification of an amount in a unit of measurement. The MaterialBaseQuantity is the corresponding quantity in the base unit of measure for the material.

The BaseQuantityUnitIndicator specifies whether the quantity unit is the base unit of quantity. If the BaseQuantityUnitIndicator is not specified, it is an alternative quantity unit. The MaterialWeights specifies the gross, net and tare weight of a material in a particular unit of measurement. The MeasureUnitCode is the coded representation of a non-monetary unit of measurement. The GrossWeightMeasure is the measurement of the gross weight for the quantity unit (amount equal 1) of the material. The NetWeightMeasure is the measurement of the net weight for the quantity unit (amount equal 1) of the material. The TareWeightMeasure is the measurement of the tare weight for the quantity unit (amount equal 1) of the material.

MaterialDimensions contain the dimensions of a material in length, width and height in one single unit of measurement. The LengthMeasure is the measurement of the length for the quantity unit (amount equal 1) of the material. The WidthMeasure is the measurement of the width for the quantity unit (amount equal 1) of the material. The HeightMeasure is the measurement of the height for the quantity unit (amount equal 1) of the material. The VolumeMeasure is the measurement of the volume for the quantity unit (amount equal 1) of the material.

Log Package

A Log package groups the messages used for user interaction. It contains the Log entity.

Log

A log is a sequence of messages that result when an application executes a task.

Message Data Type

The message data type MaterialSimpleByIDAndDescriptionQueryMessage_sync contains the Selection included in the business document. FIGS. 321-1 through 321-4 show a MaterialSimpleByIDAndDescriptionQueryMessage_sync 321000 package. The MaterialSimpleByIDAndDescriptionQueryMessage_sync 321000 package is a MaterialSimpleByIDAndDescriptionQueryMessage_sync 321004 datatype. The MaterialSimpleByIDAndDescriptionQueryMessage_sync 321000 package includes a MaterialSimpleByIDAndDescriptionQueryMessage_sync 321002 entity. The MaterialSimpleByIDAndDescriptionQueryMessage_sync 321000 package includes a Selection 321006 package.

The Selection 321006 package is a MaterialSelectionByIDAndDescription 321012 datatype. The Selection 321006 package includes a MaterialSelectionByIDAndDescription 321008 entity.

The MaterialSelectionByIDAndDescription 321008 entity has a cardinality of one 321010 meaning that for each instance of the MaterialSimpleByIDAndDescriptionQueryMessage_sync 321002 entity there is one MaterialSelectionByIDAndDescription 321008 entity. The MaterialSelectionByIDAndDescription 321008 entity includes various attributes, namely SelectionByMaterialInternalID 321014, InclusionExclusionCode 321020, IntervalBoundaryTypeCode 321026, LowerBoundaryMaterialInternalID 321032, UpperBoundaryMaterialInternalID 321038, SelectionByMaterialDescription 321044, InclusionExclusionCode 321050, IntervalBoundaryTypeCode 321056, LowerBoundaryMaterialDescription 321062, UpperBoundaryMaterialDescription 321068 and MaximumNumberValue 321074.

The SelectionByMaterialInternalID 321014 attribute is a SelectionByMaterialInternalID 321018 datatype. The SelectionByMaterialInternalID 321014 attribute has a cardinality of zero or n 321016 meaning that for each instance of the MaterialSelectionByIDAndDescription 321008 entity there may be one or more SelectionByMaterialInternalID 321014 attributes.

The InclusionExclusionCode 321020 attribute is an InclusionExclusionCode 321024 datatype. The InclusionExclusionCode 321020 attribute has a cardinality of zero or one 321022 meaning that for each instance of the MaterialSelectionByIDAndDescription 321008 entity there may be one InclusionExclusionCode 321020 attribute.

The IntervalBoundaryTypeCode 321026 attribute is an IntervalBoundaryTypeCode 321030 datatype. The IntervalBoundaryTypeCode 321026 attribute has a cardinality of one 321028 meaning that for each instance of the MaterialSelectionByIDAndDescription 321008 entity there is one IntervalBoundaryTypeCode 321026 attribute.

The LowerBoundaryMaterialInternalID 321032 attribute is a ProductInternalID 321036 datatype. The LowerBoundaryMaterialInternalID 321032 attribute has a cardinality of zero or one 321034 meaning that for each instance of the MaterialSelectionByIDAndDescription 321008 entity there may be one LowerBoundaryMaterialInternalID 321032 attribute.

The UpperBoundaryMaterialInternalID 321038 attribute is a ProductInternalID 321042 datatype. The UpperBoundaryMaterialInternalID 321038 attribute has a cardinality of zero or one 321040 meaning that for each instance of the MaterialSelectionByIDAndDescription 321008 entity there may be one UpperBoundaryMaterialInternalID 321038 attribute.

The SelectionByMaterialDescription 321044 attribute is a SelectionByMaterialDescription 321048 datatype. The SelectionByMaterialDescription 321044 attribute has a cardinality of zero or n 321046 meaning that for each instance of the MaterialSelectionByIDAndDescription 321008 entity there may be one or more SelectionByMaterialDescription 321044 attributes.

The InclusionExclusionCode 321050 attribute is an InclusionExclusionCode 321054 datatype. The InclusionExclusionCode 321050 attribute has a cardinality of zero or one 321052 meaning that for each instance of the MaterialSelectionByIDAndDescription 321008 entity there may be one InclusionExclusionCode 321050 attribute.

The IntervalBoundaryTypeCode 321056 attribute is an IntervalBoundaryTypeCode 321060 datatype. The IntervalBoundaryTypeCode 321056 attribute has a cardinality of one 321058 meaning that for each instance of the MaterialSelectionByIDAndDescription 321008 entity there is one IntervalBoundaryTypeCode 321056 attribute.

The LowerBoundaryMaterialDescription 321062 attribute is a SHORT_Description 321066 datatype. The LowerBoundaryMaterialDescription 321062 attribute has a cardinality of zero or one 321064 meaning that for each instance of the MaterialSelectionByIDAndDescription 321008 entity there may be one LowerBoundaryMaterialDescription 321062 attribute.

The UpperBoundaryMaterialDescription 321068 attribute is a SHORT_Description 321072 datatype. The UpperBoundaryMaterialDescription 321068 attribute has a cardinality of zero or one 321070 meaning that for each instance of the MaterialSelectionByIDAndDescription 321008 entity there may be one UpperBoundaryMaterialDescription 321068 attribute.

The MaximumNumberValue 321074 attribute is a NumberValue 321078 datatype. The MaximumNumberValue 321074 attribute has a cardinality of zero or one 321076 meaning that for each instance of the MaterialSelectionByIDAndDescription 321008 entity there may be one MaximumNumberValue 321074 attribute.

Selection Package

The Selection package collects the selection criteria for Material. It contains the MaterialSelectionByIDAndDescription entity MaterialSelectionByIDAndDescription The MaterialSelectionByIDAndDescription specifies search patterns for a material ID or a language-dependent description to be used to select materials. The SelectionByMaterialInternalID is a range of materials. An InclusionExclusionCode is a coded representation of the inclusion of a set into a result set or the exclusion of it. The IntervalBoundaryTypeCode is a coded representation of an interval boundary type ProductInternalID is a proprietary identifier for a material. The LowerBoundaryMaterialInternalID is the lower boundary of the material ID interval. It can be used for material ID intervals that contain a single value. The UpperBoundaryMaterialInternalID is the upper boundary of the material ID interval. The SelectionByMaterialDescription is a range of material descriptions.

LowerBoundaryMaterialDescription is a natural-language representation of the properties of a product. The LowerBoundaryMaterialDescription is the lower boundary of the material description interval. It can be used for material description intervals that contain a single value.

UpperBoundaryMaterialDescription is a natural-language representation of the properties of a product. The UpperBoundaryMaterialDescription is the upper boundary of the material description interval. The MaximumNumberValue determines the maximum number of materials matching the selection criteria of the inquiry and being displayed in the result list. Selection criteria has to be specified for the element SelectionByMaterialInternalID or for the element SelectionByMaterialDescription.

Message Data Type

The message data type MaterialSimpleByIDAndDescriptionResponseMessage_sync coincides with message data type MaterialSimpleResponseMessage. FIG. 322 shows a MaterialSimpleByIDAndDescriptionResponseMessage_sync 322000 package. The MaterialSimpleByIDAndDescriptionResponseMessage_sync 322000 package is a MaterialSimpleByIDAndDescriptionResponseMessage_sync 322004 datatype. The MaterialSimpleByIDAndDescriptionResponseMessage_sync 322000 package includes a MaterialSimpleByIDAndDescriptionResponseMessage_sync 322002 entity. The MaterialSimpleByIDAndDescriptionResponseMessage_sync 322000 package includes various packages, namely Material 322006 and Log 322032.

The Material 322006 package is a Material 322012 datatype. The Material 322006 package includes a Material 322008 entity.

The Material 322008 entity has a cardinality of zero or n 322010 meaning that for each instance of the MaterialSimpleByIDAndDescriptionResponseMessage_sync 322002 entity there may be one or more Material 322008 entities. The Material 322008 entity includes various attributes, namely InternalID 322014 and Description 322020.

The InternalID 322014 attribute is a ProductInternalID 322018 datatype. The InternalID 322014 attribute has a cardinality of one 322016 meaning that for each instance of the Material 322008 entity there is one InternalID 322014 attribute.

The Description 322020 attribute is a Description 322024 datatype. The Description 322020 attribute has a cardinality of one 322022 meaning that for each instance of the Material 322008 entity there is one Description 322020 attribute.

The Log 322032 package is a Log 322038 datatype. The Log 322032 package includes a Log 322034 entity.

The Log 322034 entity has a cardinality of zero or one 322036 meaning that for each instance of the MaterialSimpleByIDAndDescriptionResponseMessage_sync 322002 entity there may be one Log 322034 entity.

Message Data Type

The message data type MaterialSimpleByGTINQueryMessage_sync contains the Selection included in the business document. It contains the Selection package. FIG. 319 shows a MaterialSimpleByGTINQueryMessage_sync 319000 package. The MaterialSimpleByGTINQueryMessage_sync 319000 package is a MaterialSimpleByGTINQueryMessage_sync 319004 datatype. The MaterialSimpleByGTINQueryMessage_sync 319000 package includes a MaterialSimpleByGTINQueryMessage_sync 319002 entity. The MaterialSimpleByGTINQueryMessage_sync 319000 package includes a Selection 319006 package.

The Selection 319006 package is a MaterialSelectionByGTIN 319012 datatype. The Selection 319006 package includes a MaterialSelectionByGTIN 319008 entity.

The MaterialSelectionByGTIN 319008 entity has a cardinality of one 319010 meaning that for each instance of the MaterialSimpleByGTINQueryMessage_sync 319002 entity there is one MaterialSelectionByGTIN 319008 entity. The MaterialSelectionByGTIN 319008 entity includes a ProductStandardID 319014 attribute.

The ProductStandardID 319014 attribute is a ProductStandardID 319018 datatype. The ProductStandardID 319014 attribute has a cardinality of one 319016 meaning that for each instance of the MaterialSelectionByGTIN 319008 entity there is one ProductStandardID 319014 attribute.

Selection Package

The Selection package collects the selection criteria for Material. It contains the MaterialSelectionByGTIN entity.

MaterialSelectionByGTIN

The MaterialSelectionByGTIN specifies a GlobalTradeItemNumber to be used to select materials. The ProductStandardID is a standardized identifier for a product and the identification scheme is managed by an agency from the code list DE 3055.

Message Data Type

The message data type MaterialSimpleByGTINResponseMessage_sync coincides with message data type MaterialSimpleResponseMessage. FIG. 320 shows a MaterialSimpleByGTINResponseMessage_sync 320000 package. The MaterialSimpleByGTINResponseMessage_sync 320000 package is a MaterialSimpleByGTINResponseMessage_sync 320004 datatype. The MaterialSimpleByGTINResponseMessage_sync 320000 package includes a MaterialSimpleByGTINResponseMessage_sync 320002 entity. The MaterialSimpleByGTINResponseMessage_sync 320000 package includes various packages, namely Material 320006 and Log 320032.

The Material 320006 package is a Material 320012 datatype. The Material 320006 package includes a Material 320008 entity.

The Material 320008 entity has a cardinality of zero or n 320010 meaning that for each instance of the MaterialSimpleByGTINResponseMessage_sync 320002 entity there may be one or more Material 320008 entities. The Material 320008 entity includes various attributes, namely InternalID 320014 and Description 320020.

The InternalID 320014 attribute is a ProductInternalID 320018 datatype. The InternalID 320014 attribute has a cardinality of one 320016 meaning that for each instance of the Material 320008 entity there is one InternalID 320014 attribute.

The Description 320020 attribute is a Description 320024 datatype. The Description 320020 attribute has a cardinality of one 320022 meaning that for each instance of the Material 320008 entity there is one Description 320020 attribute.

The Log 320032 package is a Log 320038 datatype. The Log 320032 package includes a Log 320034 entity.

The Log 320034 entity has a cardinality of zero or one 320036 meaning that for each instance of the MaterialSimpleByGTINResponseMessage_sync 320002 entity there may be one Log 320034 entity.

Message Data Type

The message data type MaterialSimpleBySearchtextQueryMessage_sync contains the Selection included in the business document. It contains the Selection package. FIG. 323 shows a MaterialSimpleBySearchtextQueryMessage_sync 323000 package. The MaterialSimpleBySearchtextQueryMessage_sync 323000 package is a MaterialSimpleBySearchtextQueryMessage_sync 323004 datatype. The MaterialSimpleBySearchtextQueryMessage_sync 323000 package includes a MaterialSimpleBySearchtextQueryMessage_sync 323002 entity. The MaterialSimpleBySearchtextQueryMessage_sync 323000 package includes a Selection 323006 package.

The Selection 323006 package is a MaterialSelectionBySearchtext 323012 datatype. The Selection 323006 package includes a MaterialSelectionBySearchtext 323008 entity.

The MaterialSelectionBySearchtext 323008 entity has a cardinality of one 323010 meaning that for each instance of the MaterialSimpleBySearchtextQueryMessage_sync 323002 entity there is one MaterialSelectionBySearchtext 323008 entity. The MaterialSelectionBySearchtext 323008 entity includes various attributes, namely SearchText 323014 and MaximumNumberValue 323020.

The SearchText 323014 attribute is a SearchText 323018 datatype. The SearchText 323014 attribute has a cardinality of one 323016 meaning that for each instance of the MaterialSelectionBySearchtext 323008 entity there is one SearchText 323014 attribute.

The MaximumNumberValue 323020 attribute is a NumberValue 323024 datatype. The MaximumNumberValue 323020 attribute has a cardinality of zero or one 323022 meaning that for each instance of the MaterialSelectionBySearchtext 323008 entity there may be one MaximumNumberValue 323020 attribute.

Selection Package

The Selection package collects the selection criteria for Material. It contains the MaterialSelectionBySearchtext entity.

MaterialSelectionBySearchtext

The MaterialSelectionBySearchtext specifies a text that is searched to select materials.

The SearchText is a text that is searched for within a particular data content. A NumberValue is a number. The MaximumNumberValue determines the maximum number of materials matching the selection criteria of the inquiry and being displayed in the result list. Currently the TREX search engine is used for the search using the searchtext.

Message Data Type

The message data type MaterialSimpleByGTINResponseMessage_sync coincides with message data type MaterialSimpleResponseMessage. FIG. 324 shows a MaterialSimpleBySearchtextResponseMessage_sync 324000 package. The MaterialSimpleBySearchtextResponseMessage_sync 324000 package is a MaterialSimpleBySearchtextResponseMessage_sync 324004 datatype. The MaterialSimpleBySearchtextResponseMessage_sync 324000 package includes a MaterialSimpleBySearchtextResponseMessage_sync 324002 entity. The MaterialSimpleBySearchtextResponseMessage_sync 324000 package includes various packages, namely Material 324006 and Log 324032.

The Material 324006 package is a Material 324012 datatype. The Material 324006 package includes a Material 324008 entity.

The Material 324008 entity has a cardinality of zero or n 324010 meaning that for each instance of the MaterialSimpleBySearchtextResponseMessage_sync 324002 entity there may be one or more Material 324008 entities. The Material 324008 entity includes various attributes, namely InternalID 324014 and Description 324020.

The InternalID 324014 attribute is a ProductInternalID 324018 datatype. The InternalID 324014 attribute has a cardinality of one 324016 meaning that for each instance of the Material 324008 entity there is one InternalID 324014 attribute.

The Description 324020 attribute is a Description 324024 datatype. The Description 324020 attribute has a cardinality of one 324022 meaning that for each instance of the Material 324008 entity there is one Description 324020 attribute.

The Log 324032 package is a Log 324038 datatype. The Log 324032 package includes a Log 324034 entity.

The Log 324034 entity has a cardinality of zero or one 324036 meaning that for each instance of the MaterialSimpleBySearchtextResponseMessage_sync 324002 entity there may be one Log 324034 entity.

Message Data Type

The message data type MaterialSimpleResponseMessage contains the Material included in the business document. It contains the Material, Description and Log packages. FIG. 325 shows a MaterialSimpleResponseMessage 325000 package. The MaterialSimpleResponseMessage 325000 package is a MaterialSimpleResponseMessage 325004 datatype. The MaterialSimpleResponseMessage 325000 package includes a MaterialSimpleResponseMessage 325002 entity. The MaterialSimpleResponseMessage 325000 package includes various packages, namely Material 325006 and Log 325032.

The Material 325006 package is a Material 325012 datatype. The Material 325006 package includes a Material 325008 entity.

The Material 325008 entity has a cardinality of zero or n 325010 meaning that for each instance of the MaterialSimpleResponseMessage 325002 entity there may be one or more Material 325008 entities. The Material 325008 entity includes various attributes, namely InternalID 325014 and Description 325020.

The InternalID 325014 attribute is a ProductInternalID 325018 datatype. The InternalID 325014 attribute has a cardinality of one 325016 meaning that for each instance of the Material 325008 entity there is one InternalID 325014 attribute.

The Description 325020 attribute is a Description 325024 datatype. The Description 325020 attribute has a cardinality of one 325022 meaning that for each instance of the Material 325008 entity there is one Description 325020 attribute.

The Log 325032 package is a Log 325038 datatype. The Log 325032 package includes a Log 325034 entity.

The Log 325034 entity has a cardinality of zero or one 325036 meaning that for each instance of the MaterialSimpleResponseMessage 325002 entity there may be one Log 325034 entity.

Material Package

The Material package groups the Material information. It contains at least one Material entity.

Material

Material is the collection of simple information for materials. A MaterialInternalID is a proprietary identifier for a material.

Description

Description is the collection of language-dependent descriptions that describes the material. The Description is the natural-language representation of the properties of a material.

Log Package

A Log package groups the messages used for user interaction. It contains the Log entity.

Log

A log is a sequence of messages that result when an application executes a task.

Message Data Type

The message data type MaterialSalesSpecificationByIDQueryMessage_sync contains the Selection included in the business document. FIG. 317 shows a MaterialSalesSpecificationByIDQueryMessage_sync 317000 package. The MaterialSalesSpecificationByIDQueryMessage_sync 317000 package is a MaterialSalesSpecificationByIDQueryMessage_sync 317004 datatype. The MaterialSalesSpecificationByIDQueryMessage_sync 317000 package includes a MaterialSalesSpecificationByIDQueryMessage_sync 317002 entity. The MaterialSalesSpecificationByIDQueryMessage_sync 317000 package includes a Selection 317006 package.

The Selection 317006 package includes a MaterialSalesSpecificationSelectionByID 317008 entity.

The MaterialSalesSpecificationSelectionByID 317008 entity has a cardinality of one 317010 meaning that for each instance of the MaterialSalesSpecificationByIDQueryMessage_sync 317002 entity there is one MaterialSalesSpecificationSelectionByID 317008 entity. The MaterialSalesSpecificationSelectionByID 317008 entity includes various attributes, namely MaterialInternalID 317012, MaterialSalesSpecificationSalesOrganisationID 317018 and MaterialSalesSpecificationDistributionChannelCode 317024.

The MaterialInternalID 317012 attribute is a ProductInternalID 317016 datatype. The MaterialInternalID 317012 attribute has a cardinality of one 317014 meaning that for each instance of the MaterialSalesSpecificationSelectionByID 317008 entity there is one MaterialInternalID 317012 attribute.

The MaterialSalesSpecificationSalesOrganisationID 317018 attribute is an OrganisationCentreID 317022 datatype. The MaterialSalesSpecificationSalesOrganisationID 317018 attribute has a cardinality of zero or one 317020 meaning that for each instance of the MaterialSalesSpecificationSelectionByID 317008 entity there may be one MaterialSalesSpecificationSalesOrganisationID 317018 attribute.

The MaterialSalesSpecificationDistributionChannelCode 317024 attribute is a DistributionChannelCode 317028 datatype. The MaterialSalesSpecificationDistributionChannelCode 317024 attribute has a cardinality of zero or one 317026 meaning that for each instance of the MaterialSalesSpecificationSelectionByID 317008 entity there may be one MaterialSalesSpecificationDistributionChannelCode 317024 attribute.

Selection Package

The Selection package collects the selection criteria for Material. It contains the MaterialSalesSpecificationSelectionByID entity.

MaterialSalesSpecificationSelectionByID

The MaterialSalesSpecificationSelectionByID specifies a material ID for which to select a material. MaterialInternalID is a proprietary identifier for a material.

MaterialSalesSpecificationSalesOrganisationID is the unique identifier of the sales organisation.

MaterialSalesSpecificationDistributionChannelCode is the encoded representation of a distribution channel via which the materials are made available to the customer.

Message Data Type

The message data type MaterialSalesSpecificationByIDResponseMessage_sync contains the Material object included in the business document and the information of the message log. It contains the Material and Log packages. FIGS. 318-1 through 318-3 show a MaterialSalesSpecificationByIDResponseMessage_sync 318000 package. The MaterialSalesSpecificationByIDResponseMessage_sync 318000 package is a MaterialSalesSpecificationByIDResponseMessage_sync 318004 datatype. The MaterialSalesSpecificationByIDResponseMessage_sync 318000 package includes a MaterialSalesSpecificationByIDResponseMessage_sync 318002 entity. The MaterialSalesSpecificationByIDResponseMessage_sync 318000 package includes various packages, namely Material 318006 and Log 318074.

The Material 318006 package includes a Material 318008 entity.

The Material 318008 entity has a cardinality of zero or one 318010 meaning that for each instance of the MaterialSalesSpecificationByIDResponseMessage_sync 318002 entity there may be one Material 318008 entity. The Material 318008 entity includes various attributes, namely InternalID 318012, DivisionCode 318018 and DivisionDescription 318024. The Material 318008 entity has various subordinate entities, namely Description 318030 and SalesSpecification 318040.

The InternalID 318012 attribute is a ProductInternalID 318016 datatype. The InternalID 318012 attribute has a cardinality of one 318014 meaning that for each instance of the Material 318008 entity there is one InternalID 318012 attribute.

The DivisionCode 318018 attribute is a DivisionCode 318022 datatype. The DivisionCode 318018 attribute has a cardinality of zero or one 318020 meaning that for each instance of the Material 318008 entity there may be one DivisionCode 318018 attribute.

The DivisionDescription 318024 attribute is a LEN20_Description 318028 datatype. The DivisionDescription 318024 attribute has a cardinality of zero or one 318026 meaning that for each instance of the Material 318008 entity there may be one DivisionDescription 318024 attribute.

The Description 318030 entity has a cardinality of one or n 318032 meaning that for each instance of the Material 318008 entity there are one or more Description 318030 entities. The Description 318030 entity includes a Description 318034 attribute.

The Description 318034 attribute is a SHORT_Description 318038 datatype. The Description 318034 attribute has a cardinality of one 318036 meaning that for each instance of the Description 318030 entity there is one Description 318034 attribute.

The SalesSpecification 318040 entity has a cardinality of zero or n 318042 meaning that for each instance of the Material 318008 entity there may be one or more SalesSpecification 318040 entities. The SalesSpecification 318040 entity includes various attributes, namely SalesOrganisationID 318044, SalesOrganisationFormattedName 318050, DistributionChannelCode 318056, DistributionChannelName 318062 and SalesMeasureUnitCode 318068.

The SalesOrganisationID 318044 attribute is an OrganisationCentreID 318048 datatype. The SalesOrganisationID 318044 attribute has a cardinality of zero or one 318046 meaning that for each instance of the SalesSpecification 318040 entity there may be one SalesOrganisationID 318044 attribute.

The SalesOrganisationFormattedName 318050 attribute is a LANGUAGEINDEPENDENT_MEDIUM_Name 318054 datatype. The SalesOrganisationFormattedName 318050 attribute has a cardinality of zero or one 318052 meaning that for each instance of the SalesSpecification 318040 entity there may be one SalesOrganisationFormattedName 318050 attribute.

The DistributionChannelCode 318056 attribute is a DistributionChannelCode 318060 datatype. The DistributionChannelCode 318056 attribute has a cardinality of zero or one 318058 meaning that for each instance of the SalesSpecification 318040 entity there may be one DistributionChannelCode 318056 attribute.

The DistributionChannelName 318062 attribute is a MEDIUM_Name 318066 datatype. The DistributionChannelName 318062 attribute has a cardinality of zero or one 318064 meaning that for each instance of the SalesSpecification 318040 entity there may be one DistributionChannelName 318062 attribute.

The SalesMeasureUnitCode 318068 attribute is a MeasureUnitCode 318072 datatype. The SalesMeasureUnitCode 318068 attribute has a cardinality of zero or one 318070 meaning that for each instance of the SalesSpecification 318040 entity there may be one SalesMeasureUnitCode 318068 attribute.

The Log 318074 package is a Log 318080 datatype. The Log 318074 package includes a Log 318076 entity.

The Log 318076 entity has a cardinality of one 318078 meaning that for each instance of the MaterialSalesSpecificationByIDResponseMessage_sync 318002 entity there is one Log 318076 entity.

Material Package

The Material package groups the Material and its packages.

It contains the a SalesSpecification package and at least one Description package.

Material

A material is a tangible product that can be created and then represents a business value.

Its creation/production is independent of its sale and consumption/use in terms of time. A material can be traded, used in manufacture, consumed, or produced. InternalID is a proprietary identifier for a material. DivisionCode is the coded representation of a division. A division defines the responsibility for sales or profits for salable materials. DivisionDescription is the description of the division.

Description

Description is a language-dependent description of the material. Description is a natural-language representation of the properties of a material.

SalesSpecification

The SalesSpecification is the specification regarding the selling of a product specific for a distribution chain. SalesOrganisationID is the unique identifier of a SalesOrganisationCentre. SalesOrganisationName—is the name of the SalesOrganisation. DistributionChannelCode is encoded representation of a distribution channel via which the material is made available to a customer. DistributionChannelName is the name of the distribution channel. SalesMeasureUnitCode—is the coded representation of the sales measure unit code.

Log Package

A Log package groups the messages used for user interaction. It contains the Log entity.

Log

A log is a sequence of messages that result when an application executes a task.

Message Data Type

The message data type MaterialSalesSpecificationByElementsQueryMessage_sync contains the Selection included in the business document. FIGS. 315-1 through 315-6 show a MaterialSalesSpecificationByElementsQueryMessage_sync 315000 package. The MaterialSalesSpecificationByElementsQueryMessage_sync 315000 package is a MaterialSalesSpecificationByElementsQueryMessage_sync 315004 datatype. The MaterialSalesSpecificationByElementsQueryMessage_sync 315000 package includes a MaterialSalesSpecificationByElementsQueryMessage_sync 315002 entity. The MaterialSalesSpecificationByElementsQueryMessage_sync 315000 package includes a Selection 315006 package.

The Selection 315006 package includes a MaterialSalesSpecificationSelectionByElements 315008 entity.

The MaterialSalesSpecificationSelectionByElements 315008 entity has a cardinality of one 315010 meaning that for each instance of the MaterialSalesSpecificationByElementsQueryMessage_sync 315002 entity there is one MaterialSalesSpecificationSelectionByElements 315008 entity. The MaterialSalesSpecificationSelectionByElements 315008 entity includes various attributes, namely SelectionByMaterialInternalID 315012, InclusionExclusionCode 315018, IntervalBoundaryTypeCode 315024, LowerBoundaryMaterialInternalID 315030, UpperBoundaryMaterialInternalID 315036, SelectionByMaterialDescription 315042, InclusionExclusionCode 315048, IntervalBoundaryTypeCode 315054, LowerBoundaryMaterialDescription 315060, UpperBoundaryMaterialDescription 315066, SelectionByMaterialDivisionCode 315072, InclusionExclusionCode 315078, IntervalBoundaryTypeCode 315084, LowerBoundaryMaterialDivisionCode 315090, UpperBoundaryMaterialDivisionCode 315096, SelectionByMaterialSalesSpecificationSalesOrganisationID 3150102, InclusionExclusionCode 3150108, IntervalBoundaryTypeCode 3150114, LowerBoundaryMaterialSaleSpecificationSalesOrganisationID 3150120, UpperBoundaryMaterialSaleSpecificationSalesOrganisationID 3150126, SelectionByMaterialSalesSpecificationDistributionChannelCode 3150132, InclusionExclusionCode 3150138, IntervalBoundaryTypeCode 3150144, LowerBoundaryMaterialSalesSpecificationDistributionChannelCode 3150150, UpperBoundaryMaterialSalesSpecificationDistributionChannelCode 3150156 and MaximumNumberValue 3150162.

The SelectionByMaterialInternalID 315012 attribute is a SelectionByMaterialInternalID 315016 datatype. The SelectionByMaterialInternalID 315012 attribute has a cardinality of zero or n 315014 meaning that for each instance of the MaterialSalesSpecificationSelectionByElements 315008 entity there may be one or more SelectionByMaterialInternalID 315012 attributes.

The InclusionExclusionCode 315018 attribute is an InclusionExclusionCode 315022 datatype. The InclusionExclusionCode 315018 attribute has a cardinality of zero or one 315020 meaning that for each instance of the MaterialSalesSpecificationSelectionByElements 315008 entity there may be one InclusionExclusionCode 315018 attribute.

The IntervalBoundaryTypeCode 315024 attribute is an IntervalBoundaryTypeCode 315028 datatype. The IntervalBoundaryTypeCode 315024 attribute has a cardinality of one 315026 meaning that for each instance of the MaterialSalesSpecificationSelectionByElements 315008 entity there is one IntervalBoundaryTypeCode 315024 attribute.

The LowerBoundaryMaterialInternalID 315030 attribute is a ProductInternalID 315034 datatype. The LowerBoundaryMaterialInternalID 315030 attribute has a cardinality of zero or one 315032 meaning that for each instance of the MaterialSalesSpecificationSelectionByElements 315008 entity there may be one LowerBoundaryMaterialInternalID 315030 attribute.

The UpperBoundaryMaterialInternalID 315036 attribute is a ProductInternalID 315040 datatype. The UpperBoundaryMaterialInternalID 315036 attribute has a cardinality of zero or one 315038 meaning that for each instance of the MaterialSalesSpecificationSelectionByElements 315008 entity there may be one UpperBoundaryMaterialInternalID 315036 attribute.

The SelectionByMaterialDescription 315042 attribute is a SelectionByMaterialDescription 315046 datatype. The SelectionByMaterialDescription 315042 attribute has a cardinality of zero or n 315044 meaning that for each instance of the MaterialSalesSpecificationSelectionByElements 315008 entity there may be one or more SelectionByMaterialDescription 315042 attributes.

The InclusionExclusionCode 315048 attribute is an InclusionExclusionCode 315052 datatype. The InclusionExclusionCode 315048 attribute has a cardinality of zero or one 315050 meaning that for each instance of the MaterialSalesSpecificationSelectionByElements 315008 entity there may be one InclusionExclusionCode 315048 attribute.

The IntervalBoundaryTypeCode 315054 attribute is an IntervalBoundaryTypeCode 315058 datatype. The IntervalBoundaryTypeCode 315054 attribute has a cardinality of one 315056 meaning that for each instance of the MaterialSalesSpecificationSelectionByElements 315008 entity there is one IntervalBoundaryTypeCode 315054 attribute.

The LowerBoundaryMaterialDescription 315060 attribute is a SHORT_Description 315064 datatype. The LowerBoundaryMaterialDescription 315060 attribute has a cardinality of zero or one 315062 meaning that for each instance of the MaterialSalesSpecificationSelectionByElements 315008 entity there may be one LowerBoundaryMaterialDescription 315060 attribute.

The UpperBoundaryMaterialDescription 315066 attribute is a SHORT_Description 315070 datatype. The UpperBoundaryMaterialDescription 315066 attribute has a cardinality of zero or one 315068 meaning that for each instance of the MaterialSalesSpecificationSelectionByElements 315008 entity there may be one UpperBoundaryMaterialDescription 315066 attribute.

The SelectionByMaterialDivisionCode 315072 attribute is a SelectionByMaterialDivisionCode 315076 datatype. The SelectionByMaterialDivisionCode 315072 attribute has a cardinality of zero or n 315074 meaning that for each instance of the MaterialSalesSpecificationSelectionByElements 315008 entity there may be one or more SelectionByMaterialDivisionCode 315072 attributes.

The InclusionExclusionCode 315078 attribute is an InclusionExclusionCode 315082 datatype. The InclusionExclusionCode 315078 attribute has a cardinality of zero or one 315080 meaning that for each instance of the MaterialSalesSpecificationSelectionByElements 315008 entity there may be one InclusionExclusionCode 315078 attribute.

The IntervalBoundaryTypeCode 315084 attribute is an IntervalBoundaryTypeCode 315088 datatype. The IntervalBoundaryTypeCode 315084 attribute has a cardinality of one 315086 meaning that for each instance of the MaterialSalesSpecificationSelectionByElements 315008 entity there is one IntervalBoundaryTypeCode 315084 attribute.

The LowerBoundaryMaterialDivisionCode 315090 attribute is a DivisionCode 315094 datatype. The LowerBoundaryMaterialDivisionCode 315090 attribute has a cardinality of zero or one 315092 meaning that for each instance of the MaterialSalesSpecificationSelectionByElements 315008 entity there may be one LowerBoundaryMaterialDivisionCode 315090 attribute.

The UpperBoundaryMaterialDivisionCode 315096 attribute is a DivisionCode 3150100 datatype. The UpperBoundaryMaterialDivisionCode 315096 attribute has a cardinality of zero or one 315098 meaning that for each instance of the MaterialSalesSpecificationSelectionByElements 315008 entity there may be one UpperBoundaryMaterialDivisionCode 315096 attribute.

The SelectionByMaterialSalesSpecificationSalesOrganisationID 3150102 attribute is a SelectionByMaterialSalesSpecificationSalesOrganisationID 3150106 datatype. The SelectionByMaterialSalesSpecificationSalesOrganisationID 3150102 attribute has a cardinality of zero or n 3150104 meaning that for each instance of the MaterialSalesSpecificationSelectionByElements 315008 entity there may be one or more SelectionByMaterialSalesSpecificationSalesOrganisationID 3150102 attributes.

The InclusionExclusionCode 3150108 attribute is an InclusionExclusionCode 3150112 datatype. The InclusionExclusionCode 3150108 attribute has a cardinality of zero or one 3150110 meaning that for each instance of the Material- SalesSpecificationSelectionByElements 315008 entity there may be one InclusionExclusionCode 3150108 attribute.

The IntervalBoundaryTypeCode 3150114 attribute is an IntervalBoundaryTypeCode 3150118 datatype. The IntervalBoundaryTypeCode 3150114 attribute has a cardinality of one 3150116 meaning that for each instance of the MaterialSalesSpecificationSelectionByElements 315008 entity there is one IntervalBoundaryTypeCode 3150114 attribute.

The LowerBoundaryMaterialSaleSpecificationSalesOrganisationID 3150120 attribute is an OrganisationCentreID 3150124 datatype. The LowerBoundaryMaterialSaleSpecificationSalesOrganisationID 3150120 attribute has a cardinality of zero or one 3150122 meaning that for each instance of the MaterialSalesSpecificationSelectionByElements 315008 entity there may be one LowerBoundaryMaterialSaleSpecificationSalesOrganisationID 3150120 attribute.

The UpperBoundaryMaterialSaleSpecificationSalesOrganisationID 3150126 attribute is an OrganisationCentreID 3150130 datatype. The UpperBoundaryMaterialSaleSpecificationSalesOrganisationID 3150126 attribute has a cardinality of zero or one 3150128 meaning that for each instance of the MaterialSalesSpecificationSelectionByElements 315008 entity there may be one UpperBoundaryMaterialSaleSpecificationSalesOrganisationID 3150126 attribute.

The SelectionByMaterialSalesSpecificationDistributionChannelCode 3150132 attribute is a SelectionByMaterialSalesSpecificationDistributionChannelCode 3150136 datatype. The SelectionByMaterialSalesSpecificationDistributionChannelCode 3150132 attribute has a cardinality of zero or n 3150134 meaning that for each instance of the MaterialSalesSpecificationSelectionByElements 315008 entity there may be one or more SelectionByMaterialSalesSpecificationDistributionChannelCode 3150132 attributes.

The InclusionExclusionCode 3150138 attribute is an InclusionExclusionCode 3150142 datatype. The InclusionExclusionCode 3150138 attribute has a cardinality of zero or one 3150140 meaning that for each instance of the MaterialSalesSpecificationSelectionByElements 315008 entity there may be one InclusionExclusionCode 3150138 attribute.

The IntervalBoundaryTypeCode 3150144 attribute is an IntervalBoundaryTypeCode 3150148 datatype. The IntervalBoundaryTypeCode 3150144 attribute has a cardinality of one 3150146 meaning that for each instance of the MaterialSalesSpecificationSelectionByElements 315008 entity there is one IntervalBoundaryTypeCode 3150144 attribute.

The LowerBoundaryMaterialSalesSpecificationDistributionChannelCode 3150150 attribute is a DistributionChannelCode 3150154 datatype. The LowerBoundaryMaterialSalesSpecificationDistributionChannelCode 3150150 attribute has a cardinality of zero or one 3150152 meaning that for each instance of the MaterialSalesSpecificationSelectionByElements 315008 entity there may be one LowerBoundaryMaterialSalesSpecificationDistributionChannelCode 3150150 attribute.

The UpperBoundaryMaterialSalesSpecificationDistributionChannelCode 3150156 attribute is a DistributionChannelCode 3150160 datatype. The UpperBoundaryMaterialSalesSpecificationDistributionChannelCode 3150156 attribute has a cardinality of zero or one 3150158 meaning that for each instance of the MaterialSalesSpecificationSelectionByElements 315008 entity there may be one UpperBoundaryMaterialSalesSpecificationDistributionChannelCode 3150156 attribute.

The MaximumNumberValue 3150162 attribute is a NumberValue 3150166 datatype. The MaximumNumberValue 3150162 attribute has a cardinality of zero or one 3150164 meaning that for each instance of the MaterialSalesSpecificationSelectionByElements 315008 entity there may be one MaximumNumberValue 3150162 attribute.

Selection Package

The Selection package collects the selection criteria for Material. It contains the MaterialSalesSpecificationSelectionByElements entity.

MaterialSalesSpecificationSelectionByElements

The MaterialSalesSpecificationSelectionByElements specifies a material ID for which to select a material. The SelectionByMaterialInternalID is a range of materials. An InclusionExclusionCode is a coded representation of the inclusion of a set into a result set or the exclusion of it. The IntervalBoundaryTypeCode is a coded representation of an interval boundary type A ProductInternalID is a proprietary identifier for a material. The LowerBoundaryMaterialInternalID is the lower boundary of the material ID interval. It can be used for material ID intervals that contain a single value. The UpperBoundaryMaterialInternalID is the upper boundary of the material ID interval. The SelectionByMaterialDescription is a range of material descriptions. An InclusionExclusionCode is a coded representation of the inclusion of a set into a result set or the exclusion of it. The IntervalBoundaryTypeCode is a coded representation of an interval boundary type. LowerBoundaryMaterialDescription is a natural-language representation of the properties of a product. The LowerBoundaryMaterialDescription is the lower boundary of the material description interval. It can be used for material description intervals that contain a single value.

UpperBoundaryMaterialDescription is a natural-language representation of the properties of a product. The UpperBoundaryMaterialDescription is the upper boundary of the material description interval. The SelectionByMaterialDivisionCode is a range of material division codes. LowerBoundaryMaterialDivisionCode is an encoded representation of a division that defines the responsibility for sales or profit for saleable materials. The LowerBoundaryMaterialDivisionCode is the lower boundary of the material division interval. It can be used for material division intervals that contain a single value. UpperBoundaryMaterialDivisionCode is an encoded representation of a division that defines the responsibility for sales or profit for saleable materials. The UpperBoundaryMaterialDivisionCode is the upper boundary of the material division code. The SelectionByMaterialSalesSpecificationSalesOrganisationID is a range of SalesOrganisationIDs.

LowerBoundaryMaterialSalesSpecificationSalesOrganisationID is a unique identifier of the sales organisation. The LowerBoundaryMaterialSalesSpecificationSalesOrganisationID is the lower boundary of the SalesOrganisationIDs. It can be used for SalesOrganisationID intervals that contain a single value. UpperBoundaryMaterialSalesSpecificationSalesOrganisationID is a unique identifier of the sales organisation. The UpperBoundaryMaterialSalesSpecificationSalesOrganisationID is the upper boundary of the SalesOrganisationIDs.

The SelectionByMaterialSalesSpecificationDistributionChannelCode is a range of distribution channel codes. LowerBoundaryMaterialSalesSpecificationDistributionChannelCode is an encoded representation of a distribution channel via which the materials are made available to the customer. The LowerBoundaryMaterialSalesSpecificationDistributionChannelCode is the lower boundary of the distribution channel code. It can be used for distribution channel codes intervals that contain a single value. UpperBoundaryMaterialSalesSpecificationDistributionChannelCode is an encoded representation of a distribution channel via which the materials are made available to the customer. The UpperBoundaryMaterialSalesSpecificationDistributionChannelCode is the upper boundary of the distribution channel codes. A NumberValue is a number. The MaximumNumberValue determines the maximum number of materials matching the selection criteria of the inquiry and being displayed in the result list.

Message Data Type

The message data type MaterialSalesSpecificationByElementsResponseMessage_sync contains the Material object included in the business document and the information of the message log. It contains the Material and Log packages. FIGS. 316-1 through 316-2 show a MaterialSalesSpecificationByElementsResponseMessage_sync 316000 package. The MaterialSalesSpecificationByElementsResponseMessage_sync 316000 package is a MaterialSalesSpecificationByElementsResponseMessage_sync 316004 datatype. The MaterialSalesSpecificationByElementsResponseMessage_sync 316000 package includes a MaterialSalesSpecificationByElementsResponseMessage_sync 316002 entity. The MaterialSalesSpecificationByElementsResponseMessage_sync 316000 package includes various packages, namely Material 316006 and Log 316056.

The Material 316006 package includes a Material 316008 entity.

The Material 316008 entity has a cardinality of zero or n 316010 meaning that for each instance of the MaterialSalesSpecificationByElementsResponseMessage_sync 316002 entity there may be one or more Material 316008 entities. The Material 316008 entity includes an InternalID 316012 attribute. The Material 316008 entity has various subordinate entities, namely Description 316018 and SalesSpecification 316028.

The InternalID 316012 attribute is a ProductInternalID 316016 datatype. The InternalID 316012 attribute has a cardinality of one 316014 meaning that for each instance of the Material 316008 entity there is one InternalID 316012 attribute.

The Description 316018 entity has a cardinality of one or n 316020 meaning that for each instance of the Material 316008 entity there are one or more Description 316018 entities. The Description 316018 entity includes a Description 316022 attribute.

The Description 316022 attribute is a SHORT_Description 316026 datatype. The Description 316022 attribute has a cardinality of one 316024 meaning that for each instance of the Description 316018 entity there is one Description 316022 attribute.

The SalesSpecification 316028 entity has a cardinality of zero or n 316030 meaning that for each instance of the Material 316008 entity there may be one or more SalesSpecification 316028 entities. The SalesSpecification 316028 entity includes various attributes, namely SalesOrganisationID 316032, SalesOrganisationFormattedName 316038, DistributionChannelCode 316044 and DistributionChannelName 316050.

The SalesOrganisationID 316032 attribute is an OrganisationCentreID 316036 datatype. The SalesOrganisationID 316032 attribute has a cardinality of zero or one 316034 meaning that for each instance of the SalesSpecification 316028 entity there may be one SalesOrganisationID 316032 attribute.

The SalesOrganisationFormattedName 316038 attribute is a LANGUAGEINDEPENDENT_MEDIUM_Name 316042 datatype. The SalesOrganisationFormattedName 316038 attribute has a cardinality of zero or one 316040 meaning that for each instance of the SalesSpecification 316028 entity there may be one SalesOrganisationFormattedName 316038 attribute.

The DistributionChannelCode 316044 attribute is a DistributionChannelCode 316048 datatype. The DistributionChannelCode 316044 attribute has a cardinality of zero or one 316046 meaning that for each instance of the SalesSpecification 316028 entity there may be one DistributionChannelCode 316044 attribute.

The DistributionChannelName 316050 attribute is a MEDIUM_Name 316054 datatype. The DistributionChannelName 316050 attribute has a cardinality of zero or one 316052 meaning that for each instance of the SalesSpecification 316028 entity there may be one DistributionChannelName 316050 attribute.

The Log 316056 package is a Log 316062 datatype. The Log 316056 package includes a Log 316058 entity.

The Log 316058 entity has a cardinality of one 316060 meaning that for each instance of the MaterialSalesSpecificationByElementsResponseMessage_sync 316002 entity there is one Log 316058 entity.

Material Package

The Material package groups the Material and its packages.

Material

A material is a tangible product that can be created and then represents a business value.

Its creation/production is independent of its sale and consumption/use in terms of time. A material can be traded, used in manufacture, consumed, or produced. InternalID—is a proprietary identifier for a material.

Description

Description is a language-dependent description of the material. Description is a natural-language representation of the properties of a material.

SalesSpecification

The SalesSpecification is the specification regarding the selling of a product specific for a distribution chain. SalesOrganisationID is the unique identifier of a SalesOrganisationCentre. SalesOrganisationName is the name of the SalesOrganisation. DistributionChannelCode is encoded representation of a distribution channel via which the material is made available to a customer. DistributionChannelName is the name of the distribution channel. (Optional)

Log Package

A Log package groups the messages used for user interaction. It contains the Log entity.

Log

A log is a sequence of messages that result when an application executes a task.

MaterialInspection Interfaces

MaterialInspectionProcessing allows determining whether a product consistently meets defined quality requirements. In a material inspection, a material or product is inspected, using inspection specifications that have been predefined. Although the inspection results document the current quality of a material or product, this information is also useful for quality control (for example, to optimize future processes).

Message Choreography

The message choreography of FIG. 326 describes a possible logical sequence of messages that can be used to realize a material inspection business scenario. A MaterialInspectionBasicDataByElementsQuery_sync is an inquiry to Material Inspection Processing to return MaterialInspections based on certain selection criteria. The structure of the message type MaterialInspectionBasicDataByElementsQuery_sync is specified by the message data type MaterialInspectionBasicDataByElementsQueryMessage_sync.

A MaterialInspectionBasicDataByElementsResponse_sync is the response from Material Inspection Processing to the inquiry MaterialInspectionBasicDataByElementsQuery_sync. The structure of the message type MaterialInspectionBasicDataByElementsResponse_sync is specified by the message data type MaterialInspectionBasicDataByElementsResponseMessage_sync.

A MaterialInspectionByIDQuery_sync is an inquiry to Material Inspection Processing to return MaterialInspections for the MaterialInspectionID. The structure of the message type MaterialInspectionByIDQuery_sync is specified by the message data type MaterialInspectionByIDQueryMessage_sync.

A MaterialInspectionByIDResponse_sync is the response from Material Inspection Processing to the inquiry MaterialInspectionByIDQuery_sync. The structure of the message type MaterialInspectionByIDResponse_sync is specified by the message data type MaterialInspectionByIDResponseMessage_sync.

A MaterialInspectionSubsetOperationByElementsQuery_sync is an inquiry to Material Inspection Processing to return MaterialInspectionSubsetOperations based on certain selection criteria. The structure of the message type MaterialInspectionSubsetOperationByElementsQuery_sync is specified by the message data type MaterialInspectionSubsetOperationByElementsQueryMessage_sync.

A MaterialInspectionSubsetOperationByElementsResponse_sync is the response from Material Inspection Processing to the inquiry MaterialInspectionSubsetOperationByElementsQuery_sync. The structure of the message type MaterialInspectionSubsetOperationByElementsResponse_sync is specified by the message data type MaterialInspectionSubsetOperationByElementsResponse Message_sync.

A MaterialInspectionSubsetOperationInspectionActivityBasicDataByElementsQuery_sync is an inquiry to Material Inspection Processing to return MaterialInspectionSubsetOperationInspectionActivities based on certain selection criteria. The structure of the message type MaterialInspectionSubsetOperationInspectionActivityBasicData ByElementsQuery_sync is specified by the message data type MaterialInspectionSubset OperationInspectionActivityBasicDataByElements QueryMessage_sync.

A MaterialInspectionSubsetOperationInspectionActivityBasicDataByElementsResponse_sync is the response from Material Inspection Processing to the inquiry MaterialInspectionSubsetOperationInspection ActivityBasicDataByElementsQuery_sync. The structure of the message type MaterialInspectionSubsetOperationInspectionActivityBasicData ByElementsResponse_sync is specified by the message data type MaterialInspectionSubsetOperationInspectionActivityBasicDataByElementsResponseMessage_sync.

A MaterialInspectionSubsetOperationInspectionActivityByIDQuery_sync is an inquiry to Material Inspection Processing to return MaterialInspectionSubsetOperationInspectionActivities for the MaterialInspectionSubsetOperationInspectionActivityID. The structure of the message type MaterialInspectionSubsetOperationInspectionActivityByIDQuery__sync is specified by the message data type MaterialInspectionSubsetOperationInspectionActivityByID QueryMessage_sync.

A MaterialInspectionSubsetOperationInspectionActivityByIDResponse_sync is the response from Material Inspection Processing to the inquiry MaterialInspectionSubsetOperationInspectionActivity ByIDQuery_sync. The structure of the message type MaterialInspectionSubsetOperationInspectionActivityByIDResponse_sync is specified by the message data type MaterialInspectionSubsetOperation InspectionActivityByIDResponseMessage_sync.

A MaterialInspectionSubsetOperationInspectionActivityResultRecordingRequest_sync is a request to Material Inspection Processing to create MaterialInspectionSubsetOperationInspectionActivityResult. The structure of the message type MaterialInspectionSubsetOperationInspectionActivity ResultRecordingRequest_sync is specified by the message data type MaterialInspectionSubsetOperationInspectionActivity-ResultRecordingRequestMessage_sync.

A MaterialInspectionSubsetOperationInspectionActivityResultRecordingConfirmation_sync is a confirmation sent from Material Inspection Processing concerning the request to record MaterialInspectionSubsetOperationInspectionActivityResult. The structure of the message type MaterialInspectionSubsetOperationInspectionActivity ResultRecordingConfirmation_sync is specified by the message data type MaterialInspectionSubsetOperationInspectionActivityResultRecordingConfirmationMessage_sync.

A MaterialInspectionSubsetOperationInspectionActivityFindingCreateRequest_sync is a request to Material Inspection Processing to create a MaterialInspectionSubsetOperationInspectionActivityFinding. The structure of the message type MaterialInspectionSubsetOperationInspectionActivity FindingCreateRequest_sync is specified by the message data type MaterialInspectionSubsetOperationInspectionActivity-FindingCreateRequestMessage_sync.

A MaterialInspectionSubsetOperationInspectionActivityFindingCreateConfirmation_sync is a confirmation sent from Material Inspection Processing concerning the request to create a MaterialInspectionSubsetOperationInspectionActivityFinding. The structure of the message type MaterialInspectionSubsetOperationInspectionActivity FindingCreateConfirmation__sync is specified by the message data type MaterialInspectionSubsetOperationInspectionActivityFindingCreateConfirmationMessage_sync.

A MaterialInspectionSubsetOperationInspectionActivityCreateRequest_sync is a request to Material Inspection Processing to create a MaterialInspectionSubsetOperationInspectionActivity.

The structure of the message type MaterialInspectionSubsetOperationInspectionActivity CreateRequest_sync is specified by the message data type MaterialInspectionSubsetOperationInspectionActivityCreateRequestMessage_sync.

A MaterialInspectionSubsetOperationInspectionActivityCreateConfirmation_sync is a confirmation sent from Material Inspection Processing concerning the request to create a MaterialInspectionSubsetOperationInspectionActivity. The structure of the message type MaterialInspectionSubsetOperationInspectionActivity CreateConfirmation_sync is specified by the message data type MaterialInspectionSubsetOperationInspectionActivityCreateConfirmationMessage_sync.

A MaterialInspectionSubsetCreateRequest_sync is a request to Material Inspection Processing to create a MaterialInspectionSubset. The structure of the message type MaterialInspectionSubsetCreateRequest_sync is specified by the message data type MaterialInspectionSubsetCreateRequestMessage_sync.

A MaterialInspectionSubsetCreateConfirmation_sync is a confirmation sent from Material Inspection Processing concerning the request to create a MaterialInspectionSubset. The structure of the message type MaterialInspectionSubsetCreateConfirmation_sync is specified by the message data type MaterialInspectionSubsetCreateConfirmationMessage_sync.

A MaterialInspectionSubsetDecisionCreateRequest_sync is a request to Material Inspection Processing to create a MaterialInspectionSubsetDecision. The structure of the message type MaterialInspectionSubsetDecisionCreateRequest_sync is specified by the message data type MaterialInspectionSubsetDecisionCreateRequestMessage_sync.

A MaterialInspectionSubsetDecisionCreateConfirmation_sync is a confirmation sent from Material Inspection Processing concerning the request to create a MaterialInspectionSubsetDecision. The structure of the message type MaterialInspectionSubsetDecisionCreateConfirmation_sync is specified by the message data type MaterialInspectionSubsetDecisionCreateConfirmationMessage_sync.

A MaterialInspectionDecisionCreateRequest_sync is a request to Material Inspection Processing to create a MaterialInspectionDecision. The structure of the message type MaterialInspectionDecisionCreateRequest_sync is specified by the message data type MaterialInspectionDecisionCreateRequestMessage_sync.

A MaterialInspectionDecisionCreateConfirmation_sync is a confirmation sent from Material Inspection Processing concerning the request to create a MaterialInspectionDecision. The structure of the message type MaterialInspectionDecisionCreateConfirmation_sync is specified by the message data type MaterialInspectionDecisionCreateConfirmationMessage_sync.

For example, a "Quality Inspector" system 326002 can query material inspections using the MaterialInspectionBasicDataByElementsQuery_sync message 326006 as shown, for example, in FIG. 347. A "Material Inspection Processing" system 326004 can respond to the query using the MaterialInspectionBasicDataByElementsResponse_sync message 326008 as shown, for example, in FIG. 347. The "Quality Inspector" system 326002 can query material inspections by ID using the MaterialInspectionByIDQuery_sync message 326010 as shown, for example, in FIG. 347. The "Material Inspection Processing" system 326004 can respond to the query using the MaterialInspectionByIDResponse_sync message 326012 as shown, for example, in FIG. 347. The "Quality Inspector" system 326002 can query material inspections by elements using the MaterialInspectionSubsetOperationByElementsQuery_sync message 326014 as shown, for example, in FIG. 347. The "Material Inspection Processing" system 326004 can respond to the query using the MaterialInspectionSubsetOperationByElementsResponse_sync message 326016 as shown, for example, in FIG. 347. The "Quality Inspector" system 326002 can query material inspections by activity basic data using the MaterialInspectionSubsetOperationInspectionActivityBasicDataByElementsQuery_sync message 326018 as shown, for example, in FIG. 347. The "Material Inspection Processing" system 326004 can respond to the query using the MaterialInspectionSubsetOperationInspectionActivityBasicDataByElementsResponse_sync message 326020 as shown, for example, in FIG. 347. The "Quality Inspector" system 326002 can query material inspection subset operation inspection activity using the MaterialInspectionSubsetOperationInspectionActivityByIDQuery_sync message 326022 as shown, for example, in FIG. 347. The "Material Inspection Processing" system 326004 can respond to the query using the MaterialInspectionSubsetOperationInspectionActivityByIDResponse_sync message 326024 as shown, for example, in FIG. 347. The "Quality Inspector" system 326002 can query material inspection operation inspection activity using the MaterialInspectionSubsetOperationSpectionActivityResultRecordingRequest_sync message 326026 as shown, for example, in FIG. 347. The "Material Inspection Processing" system 326004 can respond to the request using the MaterialInspectionSubsetOperationInspectionActivityResultRecordingConfirmation_sync message 326028 as shown, for example, in FIG. 347. The "Quality Inspector" system 326002 can query material inspection subset operation inspection activity findings using the MaterialInspectionSubsetOperationInspectionActivityFindingCreateRequest_sync message 326030 as shown, for example, in FIG. 347. The "Material Inspection Processing" system 326004 can respond to the request using the MaterialInspectionSubsetOperationInspectionActivityFindingCreateConfirmationy_sync message 326032 as shown, for example, in FIG. 347. The "Quality Inspector" system 326002 can request to create material inspection operation inspection activity using the MaterialInspectionSubsetOperationInspectionActivityCreateRequest_sync message 326034 as shown, for example, in FIG. 347. The "Material Inspection Processing" system 326004 can respond to the request using the MaterialInspectionSubsetOperationInspectionActivityCreateConfirmation_sync message 326036 as shown, for example, in FIG. 347. The "Quality Inspector" system 326002 can request to create material inspection subsets using the MaterialInspectionSubsetCreateRequest_sync message 326038 as shown, for example, in FIG. 347. The "Material Inspection Processing" system 326004 can respond to the request using the MaterialInspectionSubsetCreateConfirmation_sync message 326040 as shown, for example, in FIG. 347. The "Quality Inspector" system 326002 can request to create material inspection subset decisions using the MaterialInspectionSubsetDecisionCreateRequest_sync message 326042 as shown, for example, in FIG. 336. The "Material Inspection Processing" system 326004 can respond to the request using the MaterialInspectionSubsetDecisionCreateConfirmation_sync message 326044 as shown, for example, in FIG. 335. The "Quality Inspector" system 326002 can request to create material inspection decisions using the MaterialInspectionDecision- CreateRequest_sync message 326046 as shown, for example, in FIG. 332. The "Material Inspection Processing" system 326004 can respond to the request using the MaterialInspectionDecisionCreateConfirmation_sync message 326048 as shown, for example, in FIG. 331.

Message Data Type

The message data type MaterialInspectionBasicDataByElementsQueryMessage_sync has the Selection for the MaterialInspection and the ProcessingConditions. FIGS. 349-1 through 349-6 show a MaterialInspectionBasicDataByElementsQueryMessage 349000 package. The MaterialInspectionBasicDataByElementsQueryMessage 349000 package is a MaterialInspectionBasicDataByElementsQueryMessage_sync 349004 datatype. The MaterialInspectionBasicDataByElementsQueryMessage 349000 package includes a MaterialInspectionBasicDataByElementsQueryMessage_sync 349002 entity. The MaterialInspectionBasicDataByElementsQueryMessage 349000 package includes various packages, namely Selection 349006 and ProcessingConditions 3490132.

The Selection 349006 package includes a MaterialInspectionBasicDataSelectionByElements 349008 entity.

The MaterialInspectionBasicDataSelectionByElements 349008 entity has a cardinality of one 349010 meaning that for each instance of the MaterialInspectionBasicDataByElementsQueryMessage_sync 349002 entity there is one MaterialInspectionBasicDataSelectionByElements 349008 entity. The MaterialInspectionBasicDataSelectionByElements 349008 entity includes various attributes, namely TypeCode 349012, DueDate 349018 and SelectionByMaterialInternalID 349024.

The TypeCode 349012 attribute is an InspectionTypeCode 349016 datatype. The TypeCode 349012 attribute has a cardinality of zero or one 349014 meaning that for each instance of the MaterialInspectionBasicDataSelectionByElements 349008 entity there may be one TypeCode 349012 attribute.

The DueDate 349018 attribute is a TIMEZONEINDEPENDENT_DateTime 349022 datatype. The DueDate 349018 attribute has a cardinality of zero or one 349020 meaning that for each instance of the MaterialInspectionBasicDataSelectionByElements 349008 entity there may be one DueDate 349018 attribute.

The SelectionByMaterialInternalID 349024 attribute is a SelectionByMaterialInternalID 349028 datatype. The SelectionByMaterialInternalID 349024 attribute has a cardinality of zero or n 349026 meaning that for each instance of the MaterialInspectionBasicDataSelectionByElements 349008 entity there may be one or more SelectionByMaterialInternalID 349024 attributes.

The ProcessingConditions 3490132 package includes a ProcessingConditions 3490134 entity.

The ProcessingConditions 3490134 entity has a cardinality of one 3490136 meaning that for each instance of the MaterialInspectionBasicDataByElementsQueryMessage_sync 349002 entity there is one ProcessingConditions 3490134 entity. The ProcessingConditions 3490134 entity includes various attributes, namely QueryHitsMaximumNumberValue 3490138 and UnlimitedQueryHitsIndicator 3490144.

The QueryHitsMaximumNumberValue 3490138 attribute is a NumberValue 3490142 datatype. The QueryHitsMaximumNumberValue 3490138 attribute has a cardinality of zero or one 3490140 meaning that for each instance of the ProcessingConditions 3490134 entity there may be one QueryHitsMaximumNumberValue 3490138 attribute.

The UnlimitedQueryHitsIndicator 3490144 attribute is an Indicator 3490148 datatype. The UnlimitedQueryHitsIndicator 3490144 attribute has a cardinality of zero or one 3490146 meaning that for each instance of the ProcessingConditions 3490134 entity there may be one UnlimitedQueryHitsIndicator 3490144 attribute.

Selection Package

The Selection package collects all the selection criteria for MaterialInspectionBasicData.

MaterialInspectionBasicDataSelectionByElements

MaterialInspectionBasicDataSelectionByElements specifies selection criteria to select MaterialInspection. TypeCode, which can be optional, defines the logistical process during which the material inspection is performed, for example, the goods receipt. DueDate, which can be optional, is a date by which the material inspection should be completed. SelectionByMaterialInternalID, which can be optional, is the selection for the material to be inspected. SelectionByPlantID is the selection for the plant of the material to be inspected. SelectionByBatchID is the selection for the batch of the material to be inspected. SupplierID is a unique identifier of the supplier of the material to be inspected. CustomerID is a unique identifier of the customer of the material to be inspected. LifeCycleStatusCode is the current step in the life cycle of the material inspection.

SelectionByMaterialInternalID can have other elements. InclusionExclusionCode, which can be optional, is the coded representation of the inclusion or the exclusion of a set into a result set. IntervalBoundaryTypeCode is the coded representation of an interval boundary type. LowerBoundaryMaterialInternalID, which can be optional, is the lower boundary for the identifier of the material. UpperBoundaryMaterialInternalID, which can be optional, is the upper boundary for the identifier of the material.

SelectionByPlantID can have other elements. InclusionExclusionCode, which can be optional, is the coded representation of the inclusion or the exclusion of a set into a result set. IntervalBoundaryTypeCode is the coded representation of an interval boundary type. LowerBoundaryPlantID, which can be optional, is the lower boundary for the identifier of the plant. UpperBoundaryPlantID, which can be optional, is the upper boundary for the identifier of the plant.

SelectionByBatchID can have other elements. InclusionExclusionCode, which can be optional, is the coded representation of the inclusion or the exclusion of a set into a result set. IntervalBoundaryTypeCode is the coded representation of an interval boundary type. LowerBoundaryBatchID, which can be optional, is the lower boundary for the identifier of the batch. UpperBoundaryBatchID, which can be optional, is the upper boundary for the identifier of the batch.

ProcessingConditions Package

The ProcessingConditions package groups means for a maximum output data size.

ProcessingConditions

ProcessingConditions specifies criteria to restrict selection of processed data. QueryHitsMaximumNumberValue is the number of hits to be returned by the query. In some instances, the default value will be set to "100". UnlimitedQueryHitsIndicator indicates when to return all available hits. When set to true, no value should be provided for QueryHitsMaximumNumberValue.

Message Data Type

The message data type MaterialInspectionBasicDataByElementsResponseMessage_sync has several items, including the MaterialInspection included in the business document the ProcessingConditions and the Log. FIGS. 350-1 through 350-6 show a MaterialInspectionBasicDataByElementsResponseMessage 350000 package. The MaterialInspectionBasicDataByElementsResponseMessage 350000 package is a MaterialInspectionBasicDataByElementsResponseMessage_sync 350004 datatype. The MaterialInspectionBasicDataByElementsResponseMessage 350000 package includes a MaterialInspectionBasicDataByElementsResponseMessage_sync 350002 entity. The MaterialInspectionBasicDataByElementsResponseMessage 350000 package includes various packages, namely MaterialInspection 350006, ProcessingConditions 3500204 and Log 3500222.

The MaterialInspection 350006 package includes a MaterialInspection 350008 entity. The MaterialInspection 350006 package includes various packages, namely BusinessTransactionDocumentReference 350078 and Decision 3500174.

The MaterialInspection 350008 entity has a cardinality of zero or n 350010 meaning that for each instance of the MaterialInspectionBasicDataByElementsResponseMessage_sync 350002 entity there may be one or more MaterialInspection 350008 entities. The MaterialInspection 350008 entity includes various attributes, namely ID 350012, LifeCycleStatusCode 350018, SkippingStatusCode 350024, TypeCode 350030, DueDate 350036, PriorityCode 350042, MaterialInternalID 350048, PlantID 350054, BatchID 350060, SupplierID 350066 and CustomerID 350072.

The ID 350012 attribute is a MaterialInspectionID 350016 datatype. The ID 350012 attribute has a cardinality of one 350014 meaning that for each instance of the MaterialInspection 350008 entity there is one ID 350012 attribute.

The LifeCycleStatusCode 350018 attribute is a MaterialInspectionLifeCycleStatusCode 350022 datatype. The LifeCycleStatusCode 350018 attribute has a cardinality of one 350020 meaning that for each instance of the MaterialInspection 350008 entity there is one LifeCycleStatusCode 350018 attribute.

The SkippingStatusCode 350024 attribute is a MaterialInspectionSkippingStatusCode 350028 datatype. The SkippingStatusCode 350024 attribute has a cardinality of one 350026 meaning that for each instance of the MaterialInspection 350008 entity there is one SkippingStatusCode 350024 attribute.

The TypeCode 350030 attribute is an InspectionTypeCode 350034 datatype. The TypeCode 350030 attribute has a cardinality of one 350032 meaning that for each instance of the MaterialInspection 350008 entity there is one TypeCode 350030 attribute.

The DueDate 350036 attribute is a TIMEZONEINDEPENDENT_DateTime 350040 datatype. The DueDate 350036 attribute has a cardinality of zero or one 350038 meaning that for each instance of the MaterialInspection 350008 entity there may be one DueDate 350036 attribute.

The PriorityCode 350042 attribute is a PriorityCode 350046 datatype. The PriorityCode 350042 attribute has a cardinality of one 350044 meaning that for each instance of the MaterialInspection 350008 entity there is one PriorityCode 350042 attribute.

The MaterialInternalID 350048 attribute is a ProductInternalID 350052 datatype. The MaterialInternalID 350048 attribute has a cardinality of one 350050 meaning that for each instance of the MaterialInspection 350008 entity there is one MaterialInternalID 350048 attribute.

The PlantID 350054 attribute is a PlantID 350058 datatype. The PlantID 350054 attribute has a cardinality of one 350056 meaning that for each instance of the MaterialInspection 350008 entity there is one PlantID 350054 attribute.

The BatchID 350060 attribute is a BatchID 350064 datatype. The BatchID 350060 attribute has a cardinality of zero or one 350062 meaning that for each instance of the MaterialInspection 350008 entity there may be one BatchID 350060 attribute.

The SupplierID 350066 attribute is a SupplierID 350070 datatype. The SupplierID 350066 attribute has a cardinality of zero or one 350068 meaning that for each instance of the MaterialInspection 350008 entity there may be one SupplierID 350066 attribute.

The CustomerID 350072 attribute is a CustomerID 350076 datatype. The CustomerID 350072 attribute has a cardinality of zero or one 350074 meaning that for each instance of the MaterialInspection 350008 entity there may be one CustomerID 350072 attribute.

The BusinessTransactionDocumentReference 350078 package includes a BusinessTransactionDocumentReference 350080 entity. The BusinessTransactionDocumentReference 350078 package includes various packages, namely PurchaseOrderReference 350084, GoodsMovementReference 3500102, ProductionOrderReference 3500126, SalesOrderReference 3500138 and OutboundDeliveryReference 3500156.

The BusinessTransactionDocumentReference 350080 entity has a cardinality of zero or one 350082 meaning that for each instance of the MaterialInspection 350008 entity there may be one BusinessTransactionDocumentReference 350080 entity.

The PurchaseOrderReference 350084 package includes a PurchaseOrderReference 350086 entity.

The PurchaseOrderReference 350086 entity has a cardinality of zero or one 350088 meaning that for each instance of the BusinessTransactionDocumentReference 350080 entity there may be one PurchaseOrderReference 350086 entity. The PurchaseOrderReference 350086 entity includes various attributes, namely ID 350090 and ItemID 350096.

The ID 350090 attribute is a PurchaseOrderID 350094 datatype. The ID 350090 attribute has a cardinality of one 350092 meaning that for each instance of the PurchaseOrderReference 350086 entity there is one ID 350090 attribute.

The ItemID 350096 attribute is a PurchaseOrderItemID 3500100 datatype. The ItemID 350096 attribute has a cardinality of one 350098 meaning that for each instance of the PurchaseOrderReference 350086 entity there is one ItemID 350096 attribute.

The GoodsMovementReference 3500102 package includes a GoodsMovementReference 3500104 entity.

The GoodsMovementReference 3500104 entity has a cardinality of zero or one 3500106 meaning that for each instance of the BusinessTransactionDocumentReference 350080 entity there may be one GoodsMovementReference 3500104 entity. The GoodsMovementReference 3500104 entity includes various attributes, namely ID 3500108, ItemID 3500114 and Year 3500120.

The ID 3500108 attribute is a GoodsMovementID 3500112 datatype. The ID 3500108 attribute has a cardinality of one 3500110 meaning that for each instance of the GoodsMovementReference 3500104 entity there is one ID 3500108 attribute.

The ItemID 3500114 attribute is a GoodsMovementItemID 3500118 datatype. The ItemID 3500114 attribute has a cardinality of one 3500116 meaning that for each instance of the GoodsMovementReference 3500104 entity there is one ItemID 3500114 attribute.

The Year 3500120 attribute is a Year 3500124 datatype. The Year 3500120 attribute has a cardinality of one 3500122 meaning that for each instance of the GoodsMovementReference 3500104 entity there is one Year 3500120 attribute.

The ProductionOrderReference 3500126 package includes a ProductionOrderReference 3500128 entity.

The ProductionOrderReference 3500128 entity has a cardinality of zero or one 3500130 meaning that for each instance of the BusinessTransactionDocumentReference 350080 entity there may be one ProductionOrderReference 3500128 entity. The ProductionOrderReference 3500128 entity includes an ID 3500132 attribute.

The ID 3500132 attribute is a ProductionOrderID 3500136 datatype. The ID 3500132 attribute has a cardinality of one 3500134 meaning that for each instance of the ProductionOrderReference 3500128 entity there is one ID 3500132 attribute.

The SalesOrderReference 3500138 package includes a SalesOrderReference 3500140 entity.

The SalesOrderReference 3500140 entity has a cardinality of zero or one 3500142 meaning that for each instance of the BusinessTransactionDocumentReference 350080 entity there may be one SalesOrderReference 3500140 entity. The SalesOrderReference 3500140 entity includes various attributes, namely ID 3500144 and ItemID 3500150.

The ID 3500144 attribute is a SalesOrderID 3500148 datatype. The ID 3500144 attribute has a cardinality of one 3500146 meaning that for each instance of the SalesOrderReference 3500140 entity there is one ID 3500144 attribute.

The ItemID 3500150 attribute is a SalesOrderItemID 3500154 datatype. The ItemID 3500150 attribute has a cardinality of one 3500152 meaning that for each instance of the SalesOrderReference 3500140 entity there is one ItemID 3500150 attribute.

The OutboundDeliveryReference 3500156 package includes an OutboundDeliveryReference 3500158 entity.

The OutboundDeliveryReference 3500158 entity has a cardinality of zero or one 3500160 meaning that for each instance of the BusinessTransactionDocumentReference 350080 entity there may be one OutboundDeliveryReference 3500158 entity. The OutboundDeliveryReference 3500158 entity includes various attributes, namely ID 3500162 and ItemID 3500168.

The ID 3500162 attribute is a DeliveryID 3500166 datatype. The ID 3500162 attribute has a cardinality of one 3500164 meaning that for each instance of the OutboundDeliveryReference 3500158 entity there is one ID 3500162 attribute.

The ItemID 3500168 attribute is a DeliveryItemID 3500172 datatype. The ItemID 3500168 attribute has a cardinality of one 3500170 meaning that for each instance of the OutboundDeliveryReference 3500158 entity there is one ItemID 3500168 attribute.

The Decision 3500174 package includes a Decision 3500176 entity.

The Decision 3500176 entity has a cardinality of zero or one 3500178 meaning that for each instance of the MaterialInspection 350008 entity there may be one Decision 3500176 entity. The Decision 3500176 entity includes various attributes, namely ParentQualityIssueCategoryID 3500180, QualityIssueCategoryID 3500186, AcceptanceStatusCode 3500192 and QualityScoreOrdinalNumberValue 3500198.

The ParentQualityIssueCategoryID 3500180 attribute is a QualityIssueCategoryID 3500184 datatype. The ParentQualityIssueCategoryID 3500180 attribute has a cardinality of one 3500182 meaning that for each instance of the Decision 3500176 entity there is one ParentQualityIssueCategoryID 3500180 attribute.

The QualityIssueCategoryID 3500186 attribute is a QualityIssueCategoryID 3500190 datatype. The QualityIssueCategoryID 3500186 attribute has a cardinality of one 3500188 meaning that for each instance of the Decision 3500176 entity there is one QualityIssueCategoryID 3500186 attribute.

The AcceptanceStatusCode 3500192 attribute is an AcceptanceStatusCode 3500196 datatype. The AcceptanceStatusCode 3500192 attribute has a cardinality of one 3500194 meaning that for each instance of the Decision 3500176 entity there is one AcceptanceStatusCode 3500192 attribute.

The QualityScoreOrdinalNumberValue 3500198 attribute is an OrdinalNumberValue 3500202 datatype. The QualityScoreOrdinalNumberValue 3500198 attribute has a cardinality of one 3500200 meaning that for each instance of the Decision 3500176 entity there is one QualityScoreOrdinalNumberValue 3500198 attribute.

The ProcessingConditions 3500204 package includes a ProcessingConditions 3500206 entity.

The ProcessingConditions 3500206 entity has a cardinality of one 3500208 meaning that for each instance of the MaterialInspectionBasicDataByElementsResponseMessage_sync 350002 entity there is one ProcessingConditions 3500206 entity. The ProcessingConditions 3500206 entity includes various attributes, namely ReturnedQueryHitsNumberValue 3500210 and MoreElementsAvailableIndicator 3500216.

The ReturnedQueryHitsNumberValue 3500210 attribute is a NumberValue 3500214 datatype. The ReturnedQueryHitsNumberValue 3500210 attribute has a cardinality of one 3500212 meaning that for each instance of the ProcessingConditions 3500206 entity there is one ReturnedQueryHitsNumberValue 3500210 attribute.

The MoreElementsAvailableIndicator 3500216 attribute is an Indicator 3500220 datatype. The MoreElementsAvailableIndicator 3500216 attribute has a cardinality of one 3500218 meaning that for each instance of the ProcessingConditions 3500206 entity there is one MoreElementsAvailableIndicator 3500216 attribute.

The Log 3500222 package is a Log 3500228 datatype. The Log 3500222 package includes a Log 3500224 entity.

The Log 3500224 entity has a cardinality of one 3500226 meaning that for each instance of the MaterialInspectionBasicDataByElementsResponseMessage_sync 350002 entity there is one Log 3500224 entity.

MaterialInspection Package

The MaterialInspection package groups the MaterialInspection with its packages. It contains the packages BusinessTransactionDocumentReference and Decision and the entity MaterialInspection MaterialInspection A document that describes the execution of an inspection for a particular material, and that is used to record this inspection. ID is a unique identifier for a material inspection. LifeCycleStatusCode is the current step in the life cycle of the material inspection. SkippingStatusCode shows if the current material inspection has been skipped. TypeCode defines the logistical process during which the material inspection is performed, for example, the goods receipt. DueDate, which can be optional, is a date by which the material inspection should be completed. PriorityCode is the urgency of the material inspection. MaterialInternalID is a unique identifier of the material to be inspected. PlantID is an identifier for the plant of the material to be inspected. BatchID, which can be optional, is an identifier for a batch of the material to be inspected. SupplierID is a unique identifier of the supplier of the material to be inspected. CustomerID is a unique identifier of the customer of the material to be inspected.

BusinessTransactionDocumentReference Package

The BusinessTransactionDocumentReference package contains references to another BusinessTransactionDocument or to an item within this document that triggers the inspection or to which the material inspection refers.

PurchaseOrderReference

A PurchaseOrderReference is a buyer's request to a seller to provide or deliver certain quantities of products at one or several dates. ID is an identifier specified by the buyer for a PurchaseOrder a MaterialInspection is referring to. ItemID is an identifier specified by the buyer for the PurchaseOrderItem a MaterialInspection is referring to.

GoodsMovementReference

A GoodsMovementReference references a GoodsMovement. GoodsMovement is a transaction resulting in a change in inventory. ID is an identifier for a GoodsMovement a MaterialInspection is referring to. ItemID is an identifier for a GoodsMovement item a MaterialInspection is referring to. Year is the year in which the GoodsMovement was created.

ProductionOrderReference

ProductionOrderReference references a ProductionOrder. ProductionOrder is an order to produce a certain amount of one or more materials in a certain time frame. ID is an identifier for a ProductionOrder a MaterialInspection is referring to.

SalesOrderReference

A SalesOrder is an agreement between a seller and a customer regarding the sale and delivery of goods associated with this at a certain time, for a certain quantity and at a certain price. An ID is an identifier of a SalesOrder to which a MaterialInspection refers. ItemID is an identifier to which an item in a SalesOrder a MaterialInspection refers.

OutboundDeliveryReference

OutboundDeliveryReference is a composition of goods that is provided for shipping by a vendor. ID is an identifier to which an OutboundDelivery a MaterialInspection refers. ItemID is an Identifier to which an OutboundDeliveryItem a MaterialInspection refers.

Decision Package

The Decision package groups information of the decision of a MaterialInspection.

Decision

Decision is a decision about the further use of the inspected material in the business process. The main purpose of the decision is the rejection or acceptance of the total quantity. ParentQualityIssueCategoryID is an identifier of a parent category of a QualityIssueCategoryCatalogue of type Decision. QualityIssueCategoryID is an identifier of a category of a QualityIssueCategoryCatalogue of type Decision. AcceptanceStatusCode is a valuation of the material inspection with respect to its acceptance or rejection in the continued business process. QualityScoreOrdinalNumberValue is a value of the quality score used to evaluate the quality of the inspected total quantity.

ProcessingConditions Package

The ProcessingConditions package groups items for a maximum output data size.

ProcessingConditions

ProcessingConditions specifies criteria to restrict selection of processed data. ReturnedQueryHitsNumberValue is a number of hits returned by the query. MoreElementsAvailableIndicator is an indicator to show that there are more hits available.

Log Package

A Log package groups the error messages used for user interaction.

Log

A Log is a sequence of messages that result when an application executes a task.

Message Data Type

The message data type MaterialInspectionByIDQueryMessage_sync contains the Selection for the MaterialInspection. FIG. 351 shows a MaterialInspectionByIDQueryMessage 351000 package. The MaterialInspectionByIDQueryMessage 351000 package is a MaterialInspectionByIDQueryMessage_sync 351004 datatype. The MaterialInspectionByIDQueryMessage 351000 package includes a MaterialInspectionByIDQueryMessage_sync 351002 entity. The MaterialInspectionByIDQueryMessage 351000 package includes a Selection 351006 package.

The Selection 351006 package includes a MaterialInspectionSelectionByID 351008 entity.

The MaterialInspectionSelectionByID 351008 entity has a cardinality of one 351010 meaning that for each instance of the MaterialInspectionByIDQueryMessage_sync 351002 entity there is one MaterialInspectionSelectionByID 351008 entity. The MaterialInspectionSelectionByID 351008 entity includes an ID 351012 attribute.

The ID 351012 attribute is a MaterialInspectionID 351016 datatype. The ID 351012 attribute has a cardinality of one 351014 meaning that for each instance of the MaterialInspectionSelectionByID 351008 entity there is one ID 351012 attribute.

Selection Package

The Selection package collects all the selection criteria for MaterialInspection.

MaterialInspectionSelectionByID

MaterialInspectionSelectionByID specifies selection criteria to select a MaterialInspection. ID is a unique identifier for a material inspection.

Message Data Type

The message data type MaterialInspectionByIDResponseMessage_sync contains the MaterialInspection included in the business document and the Log. FIGS. 352-1 through 352-11 show a MaterialInspectionByIDResponseMessage 352000 package. The MaterialInspectionByIDResponseMessage 352000 package is a MaterialInspectionByIDResponseMessage_sync 352004 datatype. The MaterialInspectionByIDResponseMessage 352000 package includes a MaterialInspectionByIDResponseMessage_sync 352002 entity. The MaterialInspectionByIDResponseMessage 352000 package includes various packages, namely MaterialInspection 352006 and Log 3520342.

The MaterialInspection 352006 package includes a MaterialInspection 352008 entity. The MaterialInspection 352006 package includes various packages, namely RuleSnapshot 3520138, BusinessTransactionDocumentReference 3520198 and Decision 3520294.

The MaterialInspection 352008 entity has a cardinality of zero or n 352010 meaning that for each instance of the MaterialInspectionByIDResponseMessage_sync 352002 entity there may be one or more MaterialInspection 352008 entities. The MaterialInspection 352008 entity includes various attributes, namely ID 352012, SystemAdministrativeData 352018, StatusObject 352024, LifeCycleStatusCode 352030, LifeCycleStatusName 352036, SkippingStatusCode 352042, TypeCode 352048, TypeName 352054, DueDate 352060, PriorityCode 352066, PriorityName 352072, MaterialInternalID 352078, MaterialDescription 352084, PlantID 352090, BatchID 352096, SupplierID 3520102, SupplierFormattedName 3520108, CustomerID 3520114, CustomerFormattedName 3520120, LotSizeQuantity 3520126 and SampleSizeQuantity 3520132.

The ID 352012 attribute is a MaterialInspectionID 352016 datatype. The ID 352012 attribute has a cardinality of one 352014 meaning that for each instance of the MaterialInspection 352008 entity there is one ID 352012 attribute.

The SystemAdministrativeData 352018 attribute is a SystemAdministrativeData 352022 datatype. The SystemAdministrativeData 352018 attribute has a cardinality of one 352020 meaning that for each instance of the MaterialInspection 352008 entity there is one SystemAdministrativeData 352018 attribute.

The StatusObject 352024 attribute is a StatusObject 352028 datatype. The StatusObject 352024 attribute has a cardinality of one 352026 meaning that for each instance of the MaterialInspection 352008 entity there is one StatusObject 352024 attribute.

The LifeCycleStatusCode 352030 attribute is a MaterialInspectionLifeCycleStatusCode 352034 datatype. The LifeCycleStatusCode 352030 attribute has a cardinality of one 352032 meaning that for each instance of the MaterialInspection 352008 entity there is one LifeCycleStatusCode 352030 attribute.

The LifeCycleStatusName 352036 attribute is a MEDIUM_Name 352040 datatype. The LifeCycleStatusName 352036 attribute has a cardinality of zero or one 352038 meaning that for each instance of the MaterialInspection 352008 entity there may be one LifeCycleStatusName 352036 attribute.

The SkippingStatusCode 352042 attribute is a MaterialInspectionSkippingStatusCode 352046 datatype. The SkippingStatusCode 352042 attribute has a cardinality of one 352044 meaning that for each instance of the MaterialInspection 352008 entity there is one SkippingStatusCode 352042 attribute.

The TypeCode 352048 attribute is an InspectionTypeCode 352052 datatype. The TypeCode 352048 attribute has a cardinality of one 352050 meaning that for each instance of the MaterialInspection 352008 entity there is one TypeCode 352048 attribute.

The TypeName 352054 attribute is a MEDIUM_Name 352058 datatype. The TypeName 352054 attribute has a cardinality of zero or one 352056 meaning that for each instance of the MaterialInspection 352008 entity there may be one TypeName 352054 attribute.

The DueDate 352060 attribute is a TIMEZONEINDEPENDENT_DateTime 352064 datatype. The DueDate 352060 attribute has a cardinality of zero or one 352062 meaning that for each instance of the MaterialInspection 352008 entity there may be one DueDate 352060 attribute.

The PriorityCode 352066 attribute is a PriorityCode 352070 datatype. The PriorityCode 352066 attribute has a cardinality of one 352068 meaning that for each instance of the MaterialInspection 352008 entity there is one PriorityCode 352066 attribute.

The PriorityName 352072 attribute is a MEDIUM_Name 352076 datatype. The PriorityName 352072 attribute has a cardinality of zero or one 352074 meaning that for each instance of the MaterialInspection 352008 entity there may be one PriorityName 352072 attribute.

The MaterialInternalID 352078 attribute is a ProductInternalID 352082 datatype. The MaterialInternalID 352078 attribute has a cardinality of one 352080 meaning that for each instance of the MaterialInspection 352008 entity there is one MaterialInternalID 352078 attribute.

The MaterialDescription 352084 attribute is a SHORT_Description 352088 datatype. The MaterialDescription 352084 attribute has a cardinality of zero or one 352086 meaning that for each instance of the MaterialInspection 352008 entity there may be one MaterialDescription 352084 attribute.

The PlantID 352090 attribute is a PlantID 352094 datatype. The PlantID 352090 attribute has a cardinality of one 352092 meaning that for each instance of the MaterialInspection 352008 entity there is one PlantID 352090 attribute.

The BatchID 352096 attribute is a BatchID 3520100 datatype. The BatchID 352096 attribute has a cardinality of zero or one 352098 meaning that for each instance of the MaterialInspection 352008 entity there may be one BatchID 352096 attribute.

The SupplierID 3520102 attribute is a SupplierID 3520106 datatype. The SupplierID 3520102 attribute has a cardinality of zero or one 3520104 meaning that for each instance of the MaterialInspection 352008 entity there may be one SupplierID 3520102 attribute.

The SupplierFormattedName 3520108 attribute is a LONG_Name 3520112 datatype. The SupplierFormattedName 3520108 attribute has a cardinality of zero or one 3520110 meaning that for each instance of the MaterialInspection 352008 entity there may be one SupplierFormattedName 3520108 attribute.

The CustomerID 3520114 attribute is a CustomerID 3520118 datatype. The CustomerID 3520114 attribute has a cardinality of zero or one 3520116 meaning that for each instance of the MaterialInspection 352008 entity there may be one CustomerID 3520114 attribute.

The CustomerFormattedName 3520120 attribute is a LONG_Name 3520124 datatype. The CustomerFormattedName 3520120 attribute has a cardinality of zero or one 3520122 meaning that for each instance of the MaterialInspection 352008 entity there may be one CustomerFormattedName 3520120 attribute.

The LotSizeQuantity 3520126 attribute is a Quantity 3520130 datatype. The LotSizeQuantity 3520126 attribute has a cardinality of one 3520128 meaning that for each instance of the MaterialInspection 352008 entity there is one LotSizeQuantity 3520126 attribute.

The SampleSizeQuantity 3520132 attribute is a Quantity 3520136 datatype. The SampleSizeQuantity 3520132 attribute has a cardinality of zero or one 3520134 meaning that for each instance of the MaterialInspection 352008 entity there may be one SampleSizeQuantity 3520132 attribute.

The RuleSnapshot 3520138 package includes a RuleSnapshot 3520140 entity.

The RuleSnapshot 3520140 entity has a cardinality of zero or one 3520142 meaning that for each instance of the MaterialInspection 352008 entity there may be one RuleSnapshot 3520140 entity. The RuleSnapshot 3520140 entity includes various attributes, namely InspectionBillOfOperationsGroupID 3520144, InspectionBillOfOperationsID 3520150, InspectionBillOfOperationsDescription 3520156, ProductionBillOfOperationsGroupID 3520162, ProductionBillOfOperationsID 3520168, ProductionBillOfOperationsTypeCode 3520174, ProductionBillOfOperationsDescription 3520180, SampleDrawingProcedureID 3520186 and SampleDrawingProcedureDescription 3520192.

The InspectionBillOfOperationsGroupID 3520144 attribute is an InspectionBillOfOperationsGroupID 3520148 datatype. The InspectionBillOfOperationsGroupID 3520144 attribute has a cardinality of zero or one 3520146 meaning that for each instance of the RuleSnapshot 3520140 entity there may be one InspectionBillOfOperationsGroupID 3520144 attribute.

The InspectionBillOfOperationsID 3520150 attribute is an InspectionBillOfOperationsID 3520154 datatype. The InspectionBillOfOperationsID 3520150 attribute has a cardinality of zero or one 3520152 meaning that for each instance of the RuleSnapshot 3520140 entity there may be one InspectionBillOfOperationsID 3520150 attribute.

The InspectionBillOfOperationsDescription 3520156 attribute is a SHORT_Description 3520160 datatype. The InspectionBillOfOperationsDescription 3520156 attribute has a cardinality of zero or one 3520158 meaning that for each instance of the RuleSnapshot 3520140 entity there may be one InspectionBillOfOperationsDescription 3520156 attribute.

The ProductionBillOfOperationsGroupID 3520162 attribute is a ProductionBillOfOperationsGroupID 3520166 datatype. The ProductionBillOfOperationsGroupID 3520162 attribute has a cardinality of zero or one 3520164 meaning that for each instance of the RuleSnapshot 3520140 entity there may be one ProductionBillOfOperationsGroupID 3520162 attribute.

The ProductionBillOfOperationsID 3520168 attribute is a ProductionBillOfOperationsID 3520172 datatype. The ProductionBillOfOperationsID 3520168 attribute has a cardinality of zero or one 3520170 meaning that for each instance of the RuleSnapshot 3520140 entity there may be one ProductionBillOfOperationsID 3520168 attribute.

The ProductionBillOfOperationsTypeCode 3520174 attribute is a ProductionBillOperationsTypeCode 3520178 datatype. The ProductionBillOfOperationsTypeCode 3520174 attribute has a cardinality of zero or one 3520176 meaning that for each instance of the RuleSnapshot 3520140 entity there may be one ProductionBillOfOperationsTypeCode 3520174 attribute.

The ProductionBillOfOperationsDescription 3520180 attribute is a SHORT_Description 3520184 datatype. The ProductionBillOfOperationsDescription 3520180 attribute has a cardinality of zero or one 3520182 meaning that for each instance of the RuleSnapshot 3520140 entity there may be one ProductionBillOfOperationsDescription 3520180 attribute.

The SampleDrawingProcedureID 3520186 attribute is a SampleDrawingProcedureID 3520190 datatype. The SampleDrawingProcedureID 3520186 attribute has a cardinality of zero or one 3520188 meaning that for each instance of the RuleSnapshot 3520140 entity there may be one SampleDrawingProcedureID 3520186 attribute.

The SampleDrawingProcedureDescription 3520192 attribute is a SHORT_Description 3520196 datatype. The SampleDrawingProcedureDescription 3520192 attribute has a cardinality of zero or one 3520194 meaning that for each instance of the RuleSnapshot 3520140 entity there may be one SampleDrawingProcedureDescription 3520192 attribute.

The BusinessTransactionDocumentReference 3520198 package includes a BusinessTransactionDocumentReference 3520200 entity. The BusinessTransactionDocumentReference 3520198 package includes various packages, namely PurchaseOrderReference 3520204, GoodsMovementReference 3520222, ProductionOrderReference 3520246, SalesOrderReference 3520258 and OutboundDeliveryReference 3520276.

The BusinessTransactionDocumentReference 3520200 entity has a cardinality of zero or one 3520202 meaning that for each instance of the MaterialInspection 352008 entity there may be one BusinessTransactionDocumentReference 3520200 entity.

The PurchaseOrderReference 3520204 package includes a PurchaseOrderReference 3520206 entity.

The PurchaseOrderReference 3520206 entity has a cardinality of zero or one 3520208 meaning that for each instance of the BusinessTransactionDocumentReference 3520200 entity there may be one PurchaseOrderReference 3520206 entity. The PurchaseOrderReference 3520206 entity includes various attributes, namely ID 3520210 and ItemID 3520216.

The ID 3520210 attribute is a PurchaseOrderID 3520214 datatype. The ID 3520210 attribute has a cardinality of one 3520212 meaning that for each instance of the PurchaseOrderReference 3520206 entity there is one ID 3520210 attribute.

The ItemID 3520216 attribute is a PurchaseOrderItemID 3520220 datatype. The ItemID 3520216 attribute has a cardinality of one 3520218 meaning that for each instance of the PurchaseOrderReference 3520206 entity there is one ItemID 3520216 attribute.

The GoodsMovementReference 3520222 package includes a GoodsMovementReference 3520224 entity.

The GoodsMovementReference 3520224 entity has a cardinality of zero or one 3520226 meaning that for each instance of the BusinessTransactionDocumentReference 3520200 entity there may be one GoodsMovementReference 3520224 entity. The GoodsMovementReference 3520224 entity includes various attributes, namely ID 3520228, ItemID 3520234 and Year 3520240.

The ID 3520228 attribute is a GoodsMovementID 3520232 datatype. The ID 3520228 attribute has a cardinality of one 3520230 meaning that for each instance of the GoodsMovementReference 3520224 entity there is one ID 3520228 attribute.

The ItemID 3520234 attribute is a GoodsMovementItemID 3520238 datatype. The ItemID 3520234 attribute has a cardinality of one 3520236 meaning that for each instance of the GoodsMovementReference 3520224 entity there is one ItemID 3520234 attribute.

The Year 3520240 attribute is a Year 3520244 datatype. The Year 3520240 attribute has a cardinality of one 3520242 meaning that for each instance of the GoodsMovementReference 3520224 entity there is one Year 3520240 attribute.

The ProductionOrderReference 3520246 package includes a ProductionOrderReference 3520248 entity.

The ProductionOrderReference 3520248 entity has a cardinality of zero or one 3520250 meaning that for each instance of the BusinessTransactionDocumentReference 3520200 entity there may be one ProductionOrderReference 3520248 entity. The ProductionOrderReference 3520248 entity includes an ID 3520252 attribute.

The ID 3520252 attribute is a ProductionOrderID 3520256 datatype. The ID 3520252 attribute has a cardinality of one 3520254 meaning that for each instance of the ProductionOrderReference 3520248 entity there is one ID 3520252 attribute.

The SalesOrderReference 3520258 package includes a SalesOrderReference 3520260 entity.

The SalesOrderReference 3520260 entity has a cardinality of zero or one 3520262 meaning that for each instance of the BusinessTransactionDocumentReference 3520200 entity there may be one SalesOrderReference 3520260 entity. The SalesOrderReference 3520260 entity includes various attributes, namely ID 3520264 and ItemID 3520270.

The ID 3520264 attribute is a SalesOrderID 3520268 datatype. The ID 3520264 attribute has a cardinality of one

3520266 meaning that for each instance of the SalesOrderReference 3520260 entity there is one ID 3520264 attribute.

The ItemID 3520270 attribute is a SalesOrderItemID 3520274 datatype. The ItemID 3520270 attribute has a cardinality of one 3520272 meaning that for each instance of the SalesOrderReference 3520260 entity there is one ItemID 3520270 attribute.

The OutboundDeliveryReference 3520276 package includes an OutboundDeliveryReference 3520278 entity.

The OutboundDeliveryReference 3520278 entity has a cardinality of zero or one 3520280 meaning that for each instance of the BusinessTransactionDocumentReference 3520200 entity there may be one OutboundDeliveryReference 3520278 entity. The OutboundDeliveryReference 3520278 entity includes various attributes, namely ID 3520282 and ItemID 3520288.

The ID 3520282 attribute is a DeliveryID 3520286 datatype. The ID 3520282 attribute has a cardinality of one 3520284 meaning that for each instance of the OutboundDeliveryReference 3520278 entity there is one ID 3520282 attribute.

The ItemID 3520288 attribute is a DeliveryItemID 3520292 datatype. The ItemID 3520288 attribute has a cardinality of one 3520290 meaning that for each instance of the OutboundDeliveryReference 3520278 entity there is one ItemID 3520288 attribute.

The Decision 3520294 package includes a Decision 3520296 entity.

The Decision 3520296 entity has a cardinality of zero or one 3520298 meaning that for each instance of the MaterialInspection 352008 entity there may be one Decision 3520296 entity. The Decision 3520296 entity includes various attributes, namely ParentQualityIssueCategoryID 3520300, ParentQualityIssueCategoryName 3520306, QualityIssueCategoryID 3520312, QualityIssueCategoryName 3520318, AcceptanceStatusCode 3520324, QualityScoreOrdinalNumberValue 3520330 and SystemAdministrativeData 3520336.

The ParentQualityIssueCategoryID 3520300 attribute is a QualityIssueCategoryID 3520304 datatype. The ParentQualityIssueCategoryID 3520300 attribute has a cardinality of one 3520302 meaning that for each instance of the Decision 3520296 entity there is one ParentQualityIssueCategoryID 3520300 attribute.

The ParentQualityIssueCategoryName 3520306 attribute is a MEDIUM_Name 3520310 datatype. The ParentQualityIssueCategoryName 3520306 attribute has a cardinality of zero or one 3520308 meaning that for each instance of the Decision 3520296 entity there may be one ParentQualityIssueCategoryName 3520306 attribute.

The QualityIssueCategoryID 3520312 attribute is a QualityIssueCategoryID 3520316 datatype. The QualityIssueCategoryID 3520312 attribute has a cardinality of one 3520314 meaning that for each instance of the Decision 3520296 entity there is one QualityIssueCategoryID 3520312 attribute.

The QualityIssueCategoryName 3520318 attribute is a MEDIUM_Name 3520322 datatype. The QualityIssueCategoryName 3520318 attribute has a cardinality of zero or one 3520320 meaning that for each instance of the Decision 3520296 entity there may be one QualityIssueCategoryName 3520318 attribute.

The AcceptanceStatusCode 3520324 attribute is an AcceptanceStatusCode 3520328 datatype. The AcceptanceStatusCode 3520324 attribute has a cardinality of one 3520326 meaning that for each instance of the Decision 3520296 entity there is one AcceptanceStatusCode 3520324 attribute.

The QualityScoreOrdinalNumberValue 3520330 attribute is an OrdinalNumberValue 3520334 datatype. The QualityScoreOrdinalNumberValue 3520330 attribute has a cardinality of one 3520332 meaning that for each instance of the Decision 3520296 entity there is one QualityScoreOrdinalNumberValue 3520330 attribute.

The SystemAdministrativeData 3520336 attribute is a SystemAdministrativeData 3520340 datatype. The SystemAdministrativeData 3520336 attribute has a cardinality of one 3520338 meaning that for each instance of the Decision 3520296 entity there is one SystemAdministrativeData 3520336 attribute.

The Log 3520342 package is a Log 3520348 datatype. The Log 3520342 package includes a Log 3520344 entity.

The Log 3520344 entity has a cardinality of one 3520346 meaning that for each instance of the MaterialInspectionByIDResponseMessage_sync 352002 entity there is one Log 3520344 entity.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection. SystemAdministrativeData is administrative data that is stored in a system. This data includes system users and change dates/times of the decision. A StatusObject describes the processing status of a material inspection sample in structured form. LifeCycleStatusCode is the current step in the life cycle of the material inspection. LifeCycleStatusName is a name of the current step in the life cycle of the material inspection. SkippingStatusCode shows if the current material inspection has been skipped. TypeCode defines the logistical process during which the material inspection is performed, for example, the goods receipt. TypeName is a name of the type of a material inspection. DueDate, which can be optional, is a date by which the material inspection should be completed. PriorityCode indicates the urgency of the material inspection. PriorityName is the name of the urgency of the material inspection. MaterialInternalID is a unique identifier of the material to be inspected. MaterialDescription, which can be optional, is a description of the material to be inspected. PlantID is an identifier for the plant of the material to be inspected. BatchID, which can be optional, is an identifier for a batch of the material to be inspected. SupplierID is a unique identifier of the supplier of the material to be inspected. SupplierFormattedName, which can be optional, is the complete, formatted name of the supplier. CustomerID is a unique identifier of the customer of the material to be inspected. CustomerFormattedName, which can be optional, is the Complete, formatted name of the customer.

LotSizeQuantity is the Lot size. In other words, it describes the quantity of the material to be inspected. The unit of measure can be defined outside of the material inspection. In the delivery process, this quantity is the delivered quantity.

SampleSizeQuantity, which can be optional, is the sample size for a sampling inspection. The sample size describes how many units are to be taken from a quantity of discrete units of the material to be inspected. The sample size can be determined using a sample size determination rule or it can be fixed.

RuleSnapshot Package

The RuleSnapshot package groups information of a MaterialInspection.

RuleSnapshot

RuleSnapshot is a snapshot of the rule that specifies how the inspection of an object can be performed. The inspection is used to check whether an object or procedure meets predefined requirements. The snapshot is necessary to document the used rule. It is possible that at a later moment the rule can not be reproduced anymore due to changes in the inspection configuration. The rule snapshot can not be changed. The rule is determined at material inspection creation. It is derived based on attributes (for example, material, vendor) of the material inspection. It contains arguments for the sample size calculation and for the sample-drawing. The sample size, the quantity of an individual sample, and the points in time for sample drawing are derived from this. InspectionBillOfOperationsGroupID is an identifier for an inspection bill of operations group. InspectionBillOfOperationsID is an identifier for an inspection bill of operations. InspectionBillOfOperationsDescription is a description of an inspection bill of operations. ProductionBillOfOperationsGroupID is an identifier for an production bill of operations group. ProductionBillOfOperationsID is an identifier for an production bill of operations. ProductionBillOfOperationsTypeCode is a coded representation of the type of an production bill of operations. ProductionBillOfOperationsDescription is a Description of an production bill of operations. SampleDrawingProcedureID, which can be optional, is a unique identifier of the sample-drawing procedure. SampleDrawingProcedureDescription, which can be optional, is a description of the sample-drawing procedure.

Depending on the business process, either an InspectionBillOfOperation or a ProductionBillOfOperation is assigned to a material inspection.

BusinessTransactionDocumentReference Package

The BusinessTransactionDocumentReference package contains references to another BusinessTransactionDocument or to an item within this document that triggers the inspection or to which the material inspection refers.

PurchaseOrderReference

A PurchaseOrderReference is a buyer's request to a seller to provide or deliver certain quantities of products at one or several dates. ID is an identifier specified by the buyer which refers to a PurchaseOrder a MaterialInspection. ItemID is an identifier specified by the buyer for the PurchaseOrderItem a MaterialInspection is referring to.

GoodsMovementReference

A GoodsMovementReference references a GoodsMovement. GoodsMovement is a transaction resulting in a change in inventory. ID is an identifier which refers to a GoodsMovement a MaterialInspection. ItemID is an identifier which refers to GoodsMovement item a MaterialInspection. Year is a Year in which the GoodsMovement was created.

ProductionOrderReference

ProductionOrderReference references a ProductionOrder. ProductionOrder is an order to produce a certain amount of one or more materials in a certain time frame. ID is an identifier for referring to a ProductionOrder a MaterialInspection.

SalesOrderReference

A SalesOrder is an agreement between a seller and a customer regarding the sale and delivery of goods associated with this at a certain time, for a certain quantity and at a certain price. ID is an identifier for referring to a SalesOrder a MaterialInspection. ItemID is an identifier for referring to an item in a SalesOrder a MaterialInspection. OutboundDeliveryReference is a composition of goods that is provided for shipping by a vendor. ID is an identifier for referring to a OutboundDelivery a MaterialInspection. ItemID is an identifier for referring to an OutboundDeliveryItem a MaterialInspection.

Decision Package

The Decision package groups information of the decision of a MaterialInspection.

Decision

Decision is a decision about the further use of the inspected material in the business process.

The main purpose of the decision is the rejection or acceptance of the total quantity. ParentQualityIssueCategoryID is an identifier of a parent category of a QualityIssueCategoryCatalogue of type Decision. ParentQualityIssueCategoryName, which can be optional, is a name of the parent category of a QualityIssueCategoryCatalogue of type Decision. QualityIssueCategoryID is an identifier of a category of a QualityIssueCategoryCatalogue of type Decision. QualityIssueCategoryName, which can be optional, is a name of the category of a QualityIssueCategoryCatalogue of type Decision. AcceptanceStatusCode is a valuation of the material inspection with respect to its acceptance or rejection in the continued business process. QualityScoreOrdinalNumberValue is a value of the quality score used to evaluate the quality of the inspected total quantity. SystemAdministrativeData is administrative data that is stored in a system. This data includes system users and change dates/times of the decision.

Message Data Type

The message data type MaterialInspectionSubsetOperationByElementsQueryMessage_sync contains the Selection for the MaterialInspection and the ProcessingConditions. FIGS. 359-1 through 359-7 show a MaterialInspectionSubsetOperationByElementsQueryMessage 359000 package. The MaterialInspectionSubsetOperationByElementsQueryMessage 359000 package is a MaterialInspectionSubsetOperationByElementsQueryMessage_sync 359004 datatype. The MaterialInspectionSubsetOperationByElementsQueryMessage 359000 package includes a MaterialInspectionSubsetOperationByElementsQueryMessage_sync 359002 entity. The MaterialInspectionSubsetOperationByElementsQueryMessage 359000 package includes various packages, namely Selection 359006 and ProcessingConditions 3590174.

The Selection 359006 package includes a MaterialInspectionSubsetOperationSelectionByElements 359008 entity.

The MaterialInspectionSubsetOperationSelectionByElements 359008 entity has a cardinality of one 359010 meaning that for each instance of the MaterialInspectionSubsetOperationByElementsQueryMessage_sync 359002 entity there is one MaterialInspectionSubsetOperationSelectionByElements 359008 entity. The MaterialInspectionSubsetOperationSelectionByElements 359008 entity includes various attributes, namely ID 359012, TypeCode 359018, DueDate 359024 and SelectionByMaterialInternalID 359030.

The ID 359012 attribute is a MaterialInspectionID 359016 datatype. The ID 359012 attribute has a cardinality of zero or one 359014 meaning that for each instance of the MaterialInspectionSubsetOperationSelectionByElements 359008 entity there may be one ID 359012 attribute.

The TypeCode 359018 attribute is an InspectionTypeCode 359022 datatype. The TypeCode 359018 attribute has a cardinality of zero or one 359020 meaning that for each instance of the MaterialInspectionSubsetOperationSelectionByElements 359008 entity there may be one TypeCode 359018 attribute.

The DueDate 359024 attribute is a TIMEZONEINDEPENDENT_DateTime 359028 datatype. The DueDate 359024 attribute has a cardinality of zero or one 359026 meaning that for each instance of the MaterialInspectionSubsetOperationSelectionByElements 359008 entity there may be one DueDate 359024 attribute.

The SelectionByMaterialInternalID 359030 attribute is a SelectionByMaterialInternalID 359034 datatype. The SelectionByMaterialInternalID 359030 attribute has a cardinality of zero or n 359032 meaning that for each instance of the MaterialInspectionSubsetOperationSelectionByElements 359008 entity there may be one or more SelectionByMaterialInternalID 359030 attributes.

The ProcessingConditions 3590174 package includes a ProcessingConditions 3590176 entity.

The ProcessingConditions 3590176 entity has a cardinality of one 3590178 meaning that for each instance of the MaterialInspectionSubsetOperationByElementsQueryMessage_sync 359002 entity there is one ProcessingConditions 3590176 entity. The ProcessingConditions 3590176 entity includes various attributes, namely QueryHitsMaximumNumberValue 3590180 and UnlimitedQueryHitsIndicator 3590186.

The QueryHitsMaximumNumberValue 3590180 attribute is a NumberValue 3590184 datatype. The QueryHitsMaximumNumberValue 3590180 attribute has a cardinality of zero or one 3590182 meaning that for each instance of the ProcessingConditions 3590176 entity there may be one QueryHitsMaximumNumberValue 3590180 attribute.

The UnlimitedQueryHitsIndicator 3590186 attribute is an Indicator 3590190 datatype. The UnlimitedQueryHitsIndicator 3590186 attribute has a cardinality of zero or one 3590188 meaning that for each instance of the ProcessingConditions 3590176 entity there may be one UnlimitedQueryHitsIndicator 3590186 attribute.

ProcessingConditions Package

Selection Package

The Selection package collects all the selection criteria for MaterialInspectionSubsetOperation.

MaterialInspectionSubsetOperationSelectionByElements

MaterialInspectionSubsetOperationSelectionByElements specifies selection criteria to select MaterialInspectionSubsetOperation. ID is a unique identifier for a material inspection.

TypeCode is a type which defines the logistical process during which the material inspection is performed, for example, the goods receipt. DueDate, which can be optional, is a date by which the material inspection should be completed.

SelectionByMaterialInternalID is the selection for the material to be inspected. SelectionByBatchID is the selection for the batch of the material to be inspected. SupplierID is a unique identifier of the supplier of the material to be inspected. CustomerID is a unique identifier of the customer of the material to be inspected. SelectionByWorkCentreID is the selection for the work centre where the material is inspected. SelectionByWorkCentreID is the selection for the plant of the work centre where the material is inspected. WorkCentreDescription is a name of the work centre where the material is inspected.

SelectionByMaterialInternalID has several elements. InclusionExclusionCode, which can be optional, is the coded representation of the inclusion or the exclusion of a set into a result set. IntervalBoundaryTypeCode is the coded representation of an interval boundary type. LowerBoundaryMaterialInternalID, which can be optional, is the lower boundary for the identifier of the material. UpperBoundaryMaterialInternalID, which can be optional, is the upper boundary for the identifier of the material. PlantID, which can be optional, is an identifier for the plant of the material to be inspected.

SelectionByBatchID has several elements. InclusionExclusionCode, which can be optional, is the coded representation of the inclusion or the exclusion of a set into a result set. IntervalBoundaryTypeCode is the coded representation of an interval boundary type. LowerBoundaryBatchID, which can be optional, is the lower boundary for the identifier of the batch. UpperBoundaryBatchID, which can be optional, is the upper boundary for the identifier of the batch.

SelectionByWorkCentreID contains several elements. InclusionExclusionCode, which can be optional, is the coded representation of the inclusion or the exclusion of a set into a result set. IntervalBoundaryTypeCode is the coded representation of an interval boundary type. LowerBoundaryWorkCentreID, which can be optional, is the lower boundary for the identifier of the work centre. UpperBoundaryWorkCentreID, which can be optional, is the upper boundary for the identifier of the work centre.

SelectionByWorkCentreID contains several elements. InclusionExclusionCode, which can be optional, is the coded representation of the inclusion or the exclusion of a set into a result set. IntervalBoundaryTypeCode is the coded representation of an interval boundary type. LowerBoundaryWorkCentrePlantID, which can be optional, is the lower boundary for the identifier for the plant of the work centre. UpperBoundaryWorkCentrePlantID, which can be optional, is the upper boundary for the identifier for the plant of the work centre.

Message Data Type

The message data type MaterialInspectionSubsetOperationByElementsResponseMessage_sync contains the MaterialInspection included in the business document, the ProcessingConditions, and the Log. FIGS. 360-1 through 360-5 show a MaterialInspectionSubsetOperationByElementsResponseMessage 360000 package. The MaterialInspectionSubsetOperationByElementsResponseMessage 360000 package is a MaterialInspectionSubsetOperationByElementsResponseMessage 360004 datatype. The MaterialInspectionSubsetOperationByElementsResponseMessage 360000 package includes a MaterialInspectionSubsetOperationByElementsResponseMessage_sync 360002 entity. The MaterialInspectionSubsetOperationByElementsResponseMessage 360000 package includes various packages, namely MaterialInspection 360006, ProcessingConditions 3600144 and Log 3600162.

The MaterialInspection 360006 package includes a MaterialInspection 360008 entity. The MaterialInspection 360006 package includes a Subset 360078 package.

The MaterialInspection 360008 entity has a cardinality of zero or n 360010 meaning that for each instance of the MaterialInspectionSubsetOperationByElementsResponseMessage_sync 360002 entity there may be one or more MaterialInspection 360008 entities. The MaterialInspection 360008 entity includes various attributes, namely ID 360012, LifeCycleStatusCode 360018, SkippingStatusCode 360024, TypeCode 360030, DueDate 360036, PriorityCode 360042, MaterialInternalID 360048, PlantID 360054, BatchID 360060, SupplierID 360066 and CustomerID 360072.

The ID 360012 attribute is a MaterialInspectionID 360016 datatype. The ID 360012 attribute has a cardinality of one 360014 meaning that for each instance of the MaterialInspection 360008 entity there is one ID 360012 attribute.

The LifeCycleStatusCode 360018 attribute is a MaterialInspectionLifeCycleStatusCode 360022 datatype. The LifeCycleStatusCode 360018 attribute has a cardinality of one 360020 meaning that for each instance of the MaterialInspection 360008 entity there is one LifeCycleStatusCode 360018 attribute.

The SkippingStatusCode 360024 attribute is a MaterialInspectionSkippingStatusCode 360028 datatype. The SkippingStatusCode 360024 attribute has a cardinality of one 360026 meaning that for each instance of the MaterialInspection 360008 entity there is one SkippingStatusCode 360024 attribute.

The TypeCode 360030 attribute is an InspectionTypeCode 360034 datatype. The TypeCode 360030 attribute has a cardinality of one 360032 meaning that for each instance of the MaterialInspection 360008 entity there is one TypeCode 360030 attribute.

The DueDate 360036 attribute is a TIMEZONEINDEPENDENT_DateTime 360040 datatype. The DueDate 360036 attribute has a cardinality of zero or one 360038 meaning that for each instance of the MaterialInspection 360008 entity there may be one DueDate 360036 attribute.

The PriorityCode 360042 attribute is a PriorityCode 360046 datatype. The PriorityCode 360042 attribute has a cardinality of one 360044 meaning that for each instance of the MaterialInspection 360008 entity there is one PriorityCode 360042 attribute.

The MaterialInternalID 360048 attribute is a ProductInternalID 360052 datatype. The MaterialInternalID 360048 attribute has a cardinality of one 360050 meaning that for each instance of the MaterialInspection 360008 entity there is one MaterialInternalID 360048 attribute.

The PlantID 360054 attribute is a PlantID 360058 datatype. The PlantID 360054 attribute has a cardinality of one 360056 meaning that for each instance of the MaterialInspection 360008 entity there is one PlantID 360054 attribute.

The BatchID 360060 attribute is a BatchID 360064 datatype. The BatchID 360060 attribute has a cardinality of zero or one 360062 meaning that for each instance of the MaterialInspection 360008 entity there may be one BatchID 360060 attribute.

The SupplierID 360066 attribute is a SupplierID 360070 datatype. The SupplierID 360066 attribute has a cardinality of zero or one 360068 meaning that for each instance of the MaterialInspection 360008 entity there may be one SupplierID 360066 attribute.

The CustomerID 360072 attribute is a CustomerID 360076 datatype. The CustomerID 360072 attribute has a cardinality of zero or one 360074 meaning that for each instance of the MaterialInspection 360008 entity there may be one CustomerID 360072 attribute.

The Subset 360078 package includes a Subset 360080 entity. The Subset 360078 package includes an Operation 3600108 package.

The Subset 360080 entity has a cardinality of one or n 360082 meaning that for each instance of the MaterialInspection 360008 entity there are one or more Subset 360080 entities. The Subset 360080 entity includes various attributes, namely ID 360084, TypeCode 360090, MaterialInspectionSampleID 360096 and Description 3600102.

The ID 360084 attribute is an InspectionSubsetID 360088 datatype. The ID 360084 attribute has a cardinality of one 360086 meaning that for each instance of the Subset 360080 entity there is one ID 360084 attribute.

The TypeCode 360090 attribute is an InspectionSubsetTypeCode 360094 datatype. The TypeCode 360090 attribute has a cardinality of one 360092 meaning that for each instance of the Subset 360080 entity there is one TypeCode 360090 attribute.

The MaterialInspectionSampleID 360096 attribute is a MaterialInspectionSampleID 3600100 datatype. The MaterialInspectionSampleID 360096 attribute has a cardinality of zero or one 360098 meaning that for each instance of the Subset 360080 entity there may be one MaterialInspectionSampleID 360096 attribute.

The Description 3600102 attribute is a LONG_Description 3600106 datatype. The Description 3600102 attribute has a cardinality of zero or one 3600104 meaning that for each instance of the Subset 360080 entity there may be one Description 3600102 attribute.

The Operation 3600108 package includes an Operation 3600110 entity.

The Operation 3600110 entity has a cardinality of one or n 3600112 meaning that for each instance of the Subset 360080 entity there are one or more Operation 3600110 entities. The Operation 3600110 entity includes various attributes, namely ID 3600114, Description 3600120, WorkCentreID 3600126, WorkCentreDescription 3600132 and WorkCentrePlantID 3600138.

The ID 3600114 attribute is a MaterialInspectionSubsetOperationID 3600118 datatype. The ID 3600114 attribute has a cardinality of one 3600116 meaning that for each instance of the Operation 3600110 entity there is one ID 3600114 attribute.

The Description 3600120 attribute is a SHORT_Description 3600124 datatype. The Description 3600120 attribute has a cardinality of zero or one 3600122 meaning that for each instance of the Operation 3600110 entity there may be one Description 3600120 attribute.

The WorkCentreID 3600126 attribute is a WorkCentreID 3600130 datatype. The WorkCentreID 3600126 attribute has a cardinality of zero or one 3600128 meaning that for each instance of the Operation 3600110 entity there may be one WorkCentreID 3600126 attribute.

The WorkCentreDescription 3600132 attribute is a SHORT_Description 3600136 datatype. The WorkCentreDescription 3600132 attribute has a cardinality of zero or one 3600134 meaning that for each instance of the Operation 3600110 entity there may be one WorkCentreDescription 3600132 attribute.

The WorkCentrePlantID 3600138 attribute is a PlantID 3600142 datatype. The WorkCentrePlantID 3600138 attribute has a cardinality of zero or one 3600140 meaning that for each instance of the Operation 3600110 entity there may be one WorkCentrePlantID 3600138 attribute.

The ProcessingConditions 3600144 package includes a ProcessingConditions 3600146 entity.

The ProcessingConditions 3600146 entity has a cardinality of one 3600148 meaning that for each instance of the MaterialInspectionSubsetOperationByElementsResponseMessage_sync 360002 entity there is one ProcessingConditions 3600146 entity. The ProcessingConditions 3600146 entity includes various attributes, namely ReturnedQueryHitsNumberValue 3600150 and MoreElementsAvailableIndicator 3600156.

The ReturnedQueryHitsNumberValue 3600150 attribute is a NumberValue 3600154 datatype. The ReturnedQueryHitsNumberValue 3600150 attribute has a cardinality of one 3600152 meaning that for each instance of the ProcessingConditions 3600146 entity there is one ReturnedQueryHitsNumberValue 3600150 attribute.

The MoreElementsAvailableIndicator 3600156 attribute is an Indicator 3600160 datatype. The MoreElementsAvailableIndicator 3600156 attribute has a cardinality of one 3600158 meaning that for each instance of the ProcessingConditions 3600146 entity there is one MoreElementsAvailableIndicator 3600156 attribute.

The Log 3600162 package is a Log 3600168 datatype. The Log 3600162 package includes a Log 3600164 entity.

The Log 3600164 entity has a cardinality of one 3600166 meaning that for each instance of the MaterialInspectionSubsetOperationByElementsResponseMessage_sync 360002 entity there is one Log 3600164 entity.

MaterialInspection Package

The MaterialInspection package groups the MaterialInspection with its packages. MaterialInspection is a document that describes the execution of an inspection for a particular material, and that is used to record this inspection.

Material Inspection

ID is a unique identifier for a material inspection. LifeCycleStatusCode is the current step in the life cycle of the material inspection. SkippingStatusCode is a status that shows if the current material inspection has been skipped. TypeCode is a type that defines the logistical process during which the material inspection is performed, for example, the goods receipt. DueDate, which can be optional, is a date by which the material inspection should be completed. PriorityCode is the urgency of the material inspection. MaterialInternalID is a unique identifier of the material to be inspected. PlantID is an identifier for the plant of the material to be inspected. BatchID, which can be optional, is an identifier for a batch of the material to be inspected. SupplierID is a unique identifier of the supplier of the material to be inspected. CustomerID is a unique identifier of the customer of the material to be inspected.

Subset Package

The Subset package groups the MaterialInspectionSubset with its packages.

Subset

Subset is a partial quantity of the total quantity to be inspected. In some special cases it may also be the total quantity. ID is a unique identifier of a subset. TypeCode is a coded representation of the type of a subset. MaterialInspectionSampleID is a unique identifier for a material inspection sample. Description is a description of the subset.

Operation Package

The Operation package groups information of the MaterialInspectionSubsetOperation. Operation is the activity associated with an inspection of one or more inspection specifications with specific technical assets at a specific work center.

ID is an identifier of a material inspection operation. Description is a description of the material inspection operation. WorkCentreID is an identifier of the work centre where the material is inspected. WorkCentreDescription is a name of the work centre where the material is inspected. WorkCentrePlantID is an identifier for the plant of the work centre where the material is inspected.

Message Data Type

The message data type MaterialInspectionSubsetOperationInspectionActivityBasicDataByElementsQueryMessage_sync contains the Selection for the MaterialInspection and the ProcessingConditions. FIGS. 361-1 through 361-8 show a MaterialInspectionSubsetOperationInspectionActivityBasicDataByElementsQueryMessage 361000 package. The MaterialInspectionSubsetOperationInspectionActivityBasicDataByElementsQueryMessage 361000 package is a MaterialInspectionSubsetOperationInspectionActivityBasicDataByElementsQueryMessage_sync 361004 datatype. The MaterialInspectionSubsetOperationInspectionActivityBasicDataByElementsQueryMessage 361000 package includes a MaterialInspectionSubsetOperationInspectionActivityBasicDataByElementsQueryMessage_sync 361002 entity. The MaterialInspectionSubsetOperationInspectionActivityBasicDataByElementsQueryMessage 361000 package includes various packages, namely Selection 361006 and ProcessingConditions 3610228.

The Selection 361006 package includes a MaterialInspectionSubsetOperationInspectionActivityBasicDataSelectionByElements 361008 entity.

The MaterialInspectionSubsetOperationInspectionActivityBasicDataSelectionByElements 361008 entity has a cardinality of one 361010 meaning that for each instance of the MaterialInspectionSubsetOperationInspectionActivityBasicDataByElementsQueryMessage_sync 361002 entity there is one MaterialInspectionSubsetOperationInspectionActivityBasicDataSelectionByElements 361008 entity. The MaterialInspectionSubsetOperationInspectionActivityBasicDataSelectionByElements 361008 entity includes various attributes, namely ID 361012, SubsetID 361018, SubsetOperationID 361024, TypeCode 361030, DueDate 361036 and SelectionByMaterialInternalID 361042.

The ID 361012 attribute is a MaterialInspectionID 361016 datatype. The ID 361012 attribute has a cardinality of zero or one 361014 meaning that for each instance of the MaterialInspectionSubsetOperationInspectionActivityBasicDataSelectionByElements 361008 entity there may be one ID 361012 attribute.

The SubsetID 361018 attribute is an InspectionSubsetID 361022 datatype. The Sub-setID 361018 attribute has a cardinality of zero or one 361020 meaning that for each instance of the MaterialInspectionSubsetOperationInspectionActivityBasicDataSelectionByElements 361008 entity there may be one SubsetID 361018 attribute.

The SubsetOperationID 361024 attribute is a MaterialInspectionSubsetOperationID 361028 datatype. The SubsetOperationID 361024 attribute has a cardinality of zero or one 361026 meaning that for each instance of the MaterialInspectionSubsetOperationInspectionActivityBasicDataSelectionByElements 361008 entity there may be one SubsetOperationID 361024 attribute.

The TypeCode 361030 attribute is an InspectionTypeCode 361034 datatype. The TypeCode 361030 attribute has a cardinality of zero or one 361032 meaning that for each instance of the MaterialInspectionSubsetOperationInspectionActivityBasicDataSelectionByElements 361008 entity there may be one TypeCode 361030 attribute.

The DueDate 361036 attribute is a TIMEZONEINDEPENDENT_DateTime 361040 datatype. The DueDate 361036 attribute has a cardinality of zero or one 361038 meaning that for each instance of the MaterialInspectionSubsetOperationInspectionActivityBasicDataSelectionByElements 361008 entity there may be one DueDate 361036 attribute.

The SelectionByMaterialInternalID 361042 attribute is a SelectionByMaterialInternalID 361046 datatype. The SelectionByMaterialInternalID 361042 attribute has a cardinality of zero or n 361044 meaning that for each instance of the MaterialInspectionSubsetOperationInspectionActivityBasicDataSelectionByElements 361008 entity there may be one or more SelectionByMaterialInternalID 361042 attributes.

The ProcessingConditions 3610228 package includes a ProcessingConditions 3610230 entity.

The ProcessingConditions 3610230 entity has a cardinality of one 3610232 meaning that for each instance of the MaterialInspectionSubsetOperationInspectionActivityBasicDataByElementsQueryMessage_sync 361002 entity there is one ProcessingConditions 3610230 entity. The ProcessingConditions 3610230 entity includes various attributes, namely ReturnedQueryHitsNumberValue 3610234 and MoreElementsAvailableIndicator 3610240.

The ReturnedQueryHitsNumberValue 3610234 attribute is a NumberValue 3610238 datatype. The ReturnedQueryHitsNumberValue 3610234 attribute has a cardinality of zero or one 3610236 meaning that for each instance of the ProcessingConditions 3610230 entity there may be one ReturnedQueryHitsNumberValue 3610234 attribute.

The MoreElementsAvailableIndicator 3610240 attribute is an Indicator 3610244 datatype. The MoreElementsAvailableIndicator 3610240 attribute has a cardinality of zero or one 3610242 meaning that for each instance of the ProcessingConditions 3610230 entity there may be one MoreElementsAvailableIndicator 3610240 attribute.

ProcessingConditions Package Selection Package

The Selection package collects all the selection criteria for MaterialInspectionSubsetOperationInspectionActivity.

MaterialnspectionSubsetOperationInspectionActivityBasicDataSelectionByElements

MaterialInspectionSubsetOperationInspectionActivityBasicDataSelectionByElement specifies selection criteria to select MaterialInspectionSubsetOperationInspectionActivity. ID is a unique identifier for a material inspection. SubsetID is a unique identifier of a subset. SubsetOperationID is an identifier of a material inspection operation. TypeCode is a type that defines the logistical process during which the material inspection is performed, for example, the goods receipt. DueDate, which can be optional, is a date by which the material inspection should be completed. SelectionByMaterialInternalID SelectionByMaterialInternalID is the selection for the material to be inspected. It contains several elements. InclusionExclusionCode, which can be optional, is the coded representation of the inclusion or the exclusion of a set into a result set. IntervalBoundaryTypeCode is the coded representation of an interval boundary type. LowerBoundaryMaterialInternalID, which can be optional, is the lower boundary for the identifier of the material. UpperBoundaryMaterialInternalID, which can be optional, is the upper boundary for the identifier of the material. PlantID, which can be optional, is an identifier for the plant of the material to be inspected.

SelectionByBatchID is the selection for the batch of the material to be inspected. It contains several elements. InclusionExclusionCode, which can be optional, is the coded representation of the inclusion or the exclusion of a set into a result set. IntervalBoundaryTypeCode is the coded representation of an interval boundary type. LowerBoundaryBatchID, which can be optional, is the lower boundary for the identifier of the batch. UpperBoundaryBatchID, which can be optional, is the upper boundary for the identifier of the batch. SupplierID is a unique identifier of the supplier of the material to be inspected. CustomerID is a unique identifier of the customer of the material to be inspected.

SelectionByWorkCentreID is the selection for the work centre where the material is inspected. It contains several elements. InclusionExclusionCode, which can be optional, is the coded representation of the inclusion or the exclusion of a set into a result set. IntervalBoundaryTypeCode is the coded representation of an interval boundary type. LowerBoundaryWorkCentreID, which can be optional, is the lower boundary for the identifier of the work centre. UpperBoundaryWorkCentreID, which can be optional, is the upper boundary for the identifier of the work centre.

SelectionByWorkCentreID is the selection for the plant of the work centre where the material is inspected. It contains several elements. InclusionExclusionCode, which can be optional, is the coded representation of the inclusion or the exclusion of a set into a result set. IntervalBoundaryTypeCode is the coded representation of an interval boundary type. LowerBoundaryWorkCentrePlantID, which can be optional, is the lower boundary for the identifier for the plant of the work centre. UpperBoundaryWorkCentrePlantID, which can be optional, is the upper boundary for the identifier for the plant of the work centre. WorkCentreDescription is a name of the work centre where the material is inspected.

SelectionByInspectionSpecificationID is the selection for inspection activity within a material inspection which refer to the inspection specification. It contains several elements. InclusionExclusionCode, which can be optional, is the coded representation of the inclusion or the exclusion of a set into a result set. IntervalBoundaryTypeCode is the coded representation of an interval boundary type. LowerBoundaryInspectionSpecificationID, which can be optional, is the lower boundary for the identifier of the inspection specification. UpperBoundaryInspectionSpecificationID, which can be optional, is the upper boundary for the identifier of the inspection specification. InspectionActivityLifeCycleStatusCode, which can be optional, is a coded representation of the current step in the life cycle of an inspection activity. LongTermInspectionIndicator is an indicator for an inspection activity to which results can be created even when material inspection is decided.

Message Data Type

The message data type MaterialInspectionSubsetOperationInspectionActivityBasicDataByElementsResponseMessage_sync contains the MaterialInspection included in the business document, the ProcessingConditions, and the Log. The MaterialInspection package groups the MaterialInspection with its packages. FIGS. 362-1 through 362-5 show a MaterialInspectionSubsetOperationInspectionActivityBasicDataByElementsResponseMessage 362000 package. The MaterialInspectionSubsetOperationInspectionActivityBasicDataByElementsResponseMessage 362000 package is a MaterialInspectionSubsetOperationInspectionActivityBasicDataByElementsResponseMessage__sync 362004 datatype. The MaterialInspectionSubsetOperationInspectionActivityBasicDataByElementsResponseMessage 362000 package includes a MaterialInspectionSubsetOperationInspectionActivityBasicDataByElementsResponseMessage_sync 362002 entity. The MaterialInspectionSubsetOperationInspectionActivityBasicDataByElementsResponseMessage 362000 package includes various packages, namely MaterialInspection 362006, ProcessingConditions 3620112 and Log 3620130.

The MaterialInspection 362006 package includes a MaterialInspection 362008 entity. The MaterialInspection 362006 package includes a Subset 362018 package.

The MaterialInspection 362008 entity has a cardinality of zero or n 362010 meaning that for each instance of the MaterialInspectionSubsetOperationInspectionActivityBasicDataByElementsResponseMessage_sync 362002 entity there may be one or more MaterialInspection 362008 entities. The MaterialInspection 362008 entity includes an ID 362012 attribute.

The ID 362012 attribute is a MaterialInspectionID 362016 datatype. The ID 362012 attribute has a cardinality of one 362014 meaning that for each instance of the MaterialInspection 362008 entity there is one ID 362012 attribute.

The Subset 362018 package includes a Subset 362020 entity. The Subset 362018 package includes an Operation 362036 package.

The Subset 362020 entity has a cardinality of one or n 362022 meaning that for each instance of the MaterialInspection 362008 entity there are one or more Subset 362020 entities. The Subset 362020 entity includes various attributes, namely ID 362024 and Description 362030.

The ID 362024 attribute is an InspectionSubsetID 362028 datatype. The ID 362024 attribute has a cardinality of one 362026 meaning that for each instance of the Subset 362020 entity there is one ID 362024 attribute.

The Description 362030 attribute is a LONG_Description 362034 datatype. The Description 362030 attribute has a cardinality of zero or one 362032 meaning that for each instance of the Subset 362020 entity there may be one Description 362030 attribute.

The Operation 362036 package includes an Operation 362038 entity.

The Operation 362038 entity has a cardinality of one or n 362040 meaning that for each instance of the Subset 362020 entity there are one or more Operation 362038 entities. The Operation 362038 entity includes various attributes, namely ID 362042 and Description 362048. The Operation 362038 entity includes an InspectionActivity 362054 subordinate entity.

The ID 362042 attribute is a MaterialInspectionSubsetOperationID 362046 datatype. The ID 362042 attribute has a cardinality of one 362044 meaning that for each instance of the Operation 362038 entity there is one ID 362042 attribute.

The Description 362048 attribute is a SHORT_Description 362052 datatype. The Description 362048 attribute has a cardinality of zero or one 362050 meaning that for each instance of the Operation 362038 entity there may be one Description 362048 attribute.

The InspectionActivity 362054 entity has a cardinality of one or n 362056 meaning that for each instance of the Operation 362038 entity there are one or more InspectionActivity 362054 entities. The InspectionActivity 362054 entity includes various attributes, namely ID 362058, Description 362064, InspectionSpecificationID 362070, InspectionSpecificationPlantID 362076, InspectionSpecificationVersionID 362082, LifeCycleStatusCode 362088, LifeCycleStatusName 362094, RequiredIndicator 3620100 and LongTermInspectionIndicator 3620106.

The ID 362058 attribute is a MaterialnspectionSubsetOperationInspectionActivityID 362062 datatype. The ID 362058 attribute has a cardinality of one 362060 meaning that for each instance of the InspectionActivity 362054 entity there is one ID 362058 attribute.

The Description 362064 attribute is a SHORT_Description 362068 datatype. The Description 362064 attribute has a cardinality of zero or one 362066 meaning that for each instance of the InspectionActivity 362054 entity there may be one Description 362064 attribute.

The InspectionSpecificationID 362070 attribute is an InspectionSpecificationID 362074 datatype. The InspectionSpecificationID 362070 attribute has a cardinality of zero or one 362072 meaning that for each instance of the InspectionActivity 362054 entity there may be one InspectionSpecificationID 362070 attribute.

The InspectionSpecificationPlantID 362076 attribute is a PlantID 362080 datatype. The InspectionSpecificationPlantID 362076 attribute has a cardinality of zero or one 362078 meaning that for each instance of the InspectionActivity 362054 entity there may be one InspectionSpecificationPlantID 362076 attribute.

The InspectionSpecificationVersionID 362082 attribute is a VersionID 362086 datatype. The InspectionSpecificationVersionID 362082 attribute has a cardinality of zero or one 362084 meaning that for each instance of the InspectionActivity 362054 entity there may be one InspectionSpecificationVersionID 362082 attribute.

The LifeCycleStatusCode 362088 attribute is an InspectionActivityLifeCycleStatusCode 362092 datatype. The LifeCycleStatusCode 362088 attribute has a cardinality of one 362090 meaning that for each instance of the InspectionActivity 362054 entity there is one LifeCycleStatusCode 362088 attribute.

The LifeCycleStatusName 362094 attribute is a MEDIUM_Name 362098 datatype. The LifeCycleStatusName 362094 attribute has a cardinality of zero or one 362096 meaning that for each instance of the InspectionActivity 362054 entity there may be one LifeCycleStatusName 362094 attribute.

The RequiredIndicator 3620100 attribute is an Indicator 3620104 datatype. The RequiredIndicator 3620100 attribute has a cardinality of one 3620102 meaning that for each instance of the InspectionActivity 362054 entity there is one RequiredIndicator 3620100 attribute.

The LongTermInspectionIndicator 3620106 attribute is an Indicator 3620110 datatype. The LongTermInspectionIndicator 3620106 attribute has a cardinality of one 3620108 meaning that for each instance of the InspectionActivity 362054 entity there is one LongTermInspectionIndicator 3620106 attribute.

The ProcessingConditions 3620112 package includes a ProcessingConditions 3620114 entity.

The ProcessingConditions 3620114 entity has a cardinality of one 3620116 meaning that for each instance of the MaterialInspectionSubsetOperationInspectionActivityBasicDataByElementsResponseMessage_sync 362002 entity there is one ProcessingConditions 3620114 entity. The ProcessingConditions 3620114 entity includes various attributes, namely ReturnedQueryHitsNumberValue 3620118 and MoreElementsAvailableIndicator 3620124.

The ReturnedQueryHitsNumberValue 3620118 attribute is a NumberValue 3620122 datatype. The ReturnedQueryHitsNumberValue 3620118 attribute has a cardinality of one 3620120 meaning that for each instance of the ProcessingConditions 3620114 entity there is one ReturnedQueryHitsNumberValue 3620118 attribute.

The MoreElementsAvailableIndicator 3620124 attribute is an Indicator 3620128 datatype. The MoreElementsAvailableIndicator 3620124 attribute has a cardinality of one 3620126 meaning that for each instance of the ProcessingConditions 3620114 entity there is one MoreElementsAvailableIndicator 3620124 attribute.

The Log 3620130 package is a Log 3620136 datatype. The Log 3620130 package includes a Log 3620132 entity.

The Log 3620132 entity has a cardinality of one 3620134 meaning that for each instance of the MaterialInspectionSubsetOperationInspectionActivityBasicDataByElementsResponseMessage_sync 362002 entity there is one Log 3620132 entity.

MaterialInspection

MaterialInspection is a document that describes the execution of an inspection for a particular material, and that is used to record this inspection.

Material Inspection

ID is a unique identifier for a material inspection.

Subset Package

The Subset package groups the MaterialInspectionSubset with its packages.

Subset

Subset is a partial quantity of the total quantity to be inspected. In some cases, it may also be the total quantity. ID is a unique identifier of a subset. Description is a description of the subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation. Description is a description of the material inspection operation.

InspectionActivity Package

The InspectionActivity package groups information of the MaterialInspectionSubsetOperationInspectionActivity. InspectionActivity is a detailed work instruction how an inspection has to be performed. ID is an identifier of an inspection activity. Description is a Description of the inspection activity. InspectionSpecificationID is an identifier of the inspection specification. InspectionSpecificationPlantID is an identifier of the plant of the inspection specification. InspectionSpecificationVersionID is an identifier of the version of the inspection specification. LifeCycleStatusCode is a coded representation of the current step in the life cycle of an inspection activity. LifeCycleStatusName, which can be optional, is a name of the current step in the life cycle of an inspection activity. RequiredIndicator is an indicator to show that processing of the inspection activity is required. LongTermInspectionIndicator is an indicator to show that results can be recorded even when material inspection is decided.

Message Data Type

The message data type MaterialInspectionSubsetOperationInspectionActivityByIDQueryMessage_sync contains the Selection for the MaterialInspection. FIGS. 363-1 through 363-2 show a MaterialInspectionSubsetOperationInspectionActivityByIDQueryMessage 363000 package. The MaterialInspectionSubsetOperationInspectionActivityByIDQueryMessage 363000 package is a MaterialInspectionSubsetOperationInspectionActivityByIDQueryMessage_sync 363004 datatype. The MaterialInspectionSubsetOperationInspectionActivityByIDQueryMessage 363000 package includes a MaterialInspectionSubsetOperationInspectionActivityByIDQueryMessage_sync 363002 entity. The MaterialInspectionSubsetOperationInspectionActivityByIDQueryMessage 363000 package includes a Selection 363006 package.

The Selection 363006 package includes a MaterialInspectionSubsetOperationInspectionActivitySelectionByID 363008 entity.

The MaterialInspectionSubsetOperationInspectionActivitySelectionByID 363008 entity has a cardinality of one 363010 meaning that for each instance of the MaterialInspectionSubsetOperationInspectionActivityByIDQueryMessage_sync 363002 entity there is one MaterialInspectionSubsetOperationInspectionActivitySelectionByID 363008 entity. The MaterialInspectionSubsetOperationInspectionActivitySelectionByID 363008 entity includes various attributes, namely ID 363012, SubsetID 363018, SubsetOperationID 363024 and SubsetOperationInspectionActivityID 363030.

The ID 363012 attribute is a MaterialInspectionID 363016 datatype. The ID 363012 attribute has a cardinality of one 363014 meaning that for each instance of the MaterialInspectionSubsetOperationInspectionActivitySelectionByID 363008 entity there is one ID 363012 attribute.

The SubsetID 363018 attribute is an InspectionSubsetID 363022 datatype. The SubsetID 363018 attribute has a cardinality of one 363020 meaning that for each instance of the MaterialInspectionSubsetOperationInspectionActivitySelectionByID 363008 entity there is one SubsetID 363018 attribute.

The SubsetOperationID 363024 attribute is a MaterialInspectionSubsetOperationID 363028 datatype. The SubsetOperationID 363024 attribute has a cardinality of one 363026 meaning that for each instance of the MaterialInspectionSubsetOperationInspectionActivitySelectionByID 363008 entity there is one SubsetOperationID 363024 attribute.

The SubsetOperationInspectionActivityID 363030 attribute is a MaterialnspectionSubsetOperationInspectionActivityID 363034 datatype. The SubsetOperationInspectionActivityID 363030 attribute has a cardinality of one 363032 meaning that for each instance of the MaterialInspectionSubsetOperationInspectionActivitySelectionByID 363008 entity there is one SubsetOperationInspectionActivityID 363030 attribute.

Selection Package

The Selection package collects all the selection criteria for MaterialInspectionSubsetOperationInspectionActivity.

MaterialInspectionSubsetOperationInspectionActivitySelectionByID

MaterialInspectionSubsetOperationInspectionActivityByID specifies selection criteria to select an InspectionActivity. ID is a unique identifier for a material inspection. SubsetID is a unique identifier of a subset. SubsetOperationID is an identifier of a material inspection operation. SubsetOperationInspectionActivityID is an identifier of an inspection activity.

Message Data Type

The message data type MaterialInspectionSubsetOperationInspectionActivityByIDResponseMessage_sync contains the MaterialInspection included in the business document and the Log. FIGS. 364-1 through 364-17 show a MaterialnspectionSubsetOperationInspectionActivityByIDResponseMessage 364000 package. The MaterialInspectionSubsetOperationInspectionActivityByIDResponseMessage 364000 package is a MaterialInspectionSubsetOperationInspectionActivityByIDResponseMessage_sync 364004 datatype. The MaterialInspectionSubsetOperationInspectionActivityByIDResponseMessage 364000 package includes a MaterialInspectionSubsetOperationInspectionActivityByIDResponseMessage_sync 364002 entity. The MaterialInspectionSubsetOperationInspectionActivityByIDResponseMessage 364000 package includes various packages, namely MaterialInspection 364006 and Log 3640330.

The MaterialInspection 364006 package includes a MaterialInspection 364008 entity. The MaterialInspection 364006 package includes a Subset 364024 package.

The MaterialInspection 364008 entity has a cardinality of zero or one 364010 meaning that for each instance of the MaterialInspectionSubsetOperationInspectionActivityByIDResponseMessage_sync 364002 entity there may be one MaterialInspection 364008 entity. The MaterialInspection 364008 entity includes various attributes, namely ID 364012 and ChangeStateID 364018.

The ID 364012 attribute is a MaterialInspectionID 364016 datatype. The ID 364012 attribute has a cardinality of one 364014 meaning that for each instance of the MaterialInspection 364008 entity there is one ID 364012 attribute.

The ChangeStateID 364018 attribute is a ChangeStateID 364022 datatype. The ChangeStateID 364018 attribute has a cardinality of zero or one 364020 meaning that for each instance of the MaterialInspection 364008 entity there may be one ChangeStateID 364018 attribute.

The Subset 364024 package includes a Subset 364026 entity. The Subset 364024 package includes an Operation 364054 package.

The Subset 364026 entity has a cardinality of one 364028 meaning that for each instance of the MaterialInspection 364008 entity there is one Subset 364026 entity. The Sub-set 364026 entity includes various attributes, namely ID 364030, TypeCode 364036, MaterialInspectionSampleID 364042 and Description 364048.

The ID 364030 attribute is an InspectionSubsetID 364034 datatype. The ID 364030 attribute has a cardinality of one 364032 meaning that for each instance of the Subset 364026 entity there is one ID 364030 attribute.

The TypeCode 364036 attribute is an InspectionSubsetTypeCode 364040 datatype. The TypeCode 364036 attribute has a cardinality of one 364038 meaning that for each instance of the Subset 364026 entity there is one TypeCode 364036 attribute.

The MaterialInspectionSampleID 364042 attribute is a MaterialInspectionSampleID 364046 datatype. The MaterialInspectionSampleID 364042 attribute has a cardinality of zero or one 364044 meaning that for each instance of the Subset 364026 entity there may be one MaterialInspectionSampleID 364042 attribute.

The Description 364048 attribute is a LONG_Description 364052 datatype. The Description 364048 attribute has a cardinality of zero or one 364050 meaning that for each instance of the Subset 364026 entity there may be one Description 364048 attribute.

The Operation 364054 package includes an Operation 364056 entity. The Operation 364054 package includes an InspectionActivity 364072 package.

The Operation 364056 entity has a cardinality of one 364058 meaning that for each instance of the Subset 364026 entity there is one Operation 364056 entity. The Operation 364056 entity includes various attributes, namely ID 364060 and Description 364066.

The ID 364060 attribute is a MaterialInspectionSubsetOperationID 364064 datatype. The ID 364060 attribute has a cardinality of one 364062 meaning that for each instance of the Operation 364056 entity there is one ID 364060 attribute.

The Description 364066 attribute is a SHORT_Description 364070 datatype. The Description 364066 attribute has a cardinality of zero or one 364068 meaning that for each instance of the Operation 364056 entity there may be one Description 364066 attribute.

The InspectionActivity 364072 package includes an InspectionActivity 364074 entity. The InspectionActivity 364072 package includes a Result 3640270 package.

The InspectionActivity 364074 entity has a cardinality of one 364076 meaning that for each instance of the Operation 364056 entity there is one InspectionActivity 364074 entity. The InspectionActivity 364074 entity includes various attributes, namely ID 364078, Description 364084, InspectionSpecificationID 364090, InspectionSpecificationPlantID 364096, InspectionSpecificationVersionID 3640102, LifeCycleStatusCode 3640108, LifeCycleStatusName 3640114, RequiredIndicator 3640120, LongTermInspectionIndicator 3640126, InspectionSampleSizeDeterminationAndValuationRuleID 3640132, InspectionSampleSizeDeterminationAndValuationRuleDescription 3640138, SampleSizeQuantity 3640144, SampleDrawingQuantity 3640150, SingleValueResultRecordingRequiredIndicator 3640156, MeasureResultRecordingRequiredIndicator 3640162, QualityIssueCategoryResultRecordingRequiredIndicator 3640168, InspectedNumberValueResultRecordingRequiredIndicator 3640174, AcceptanceStatusCodeResultRecordingRequiredIndicator 3640180, Measure 3640186, MeasureTypeCode 3640192, LowerToleranceMeasure 3640198, UpperToleranceMeasure 3640204, CharacteristicAttributeQualityIssueCategoryCatalogueID 3640210, CharacteristicAttributeParentQualityIssueCategoryID 3640216, CharacteristicAttributeParentQualityIssueCategoryName 3640222, CharacteristicAttributeQualityIssueCategoryFilterCode 3640228, FindingReportedIndicator 3640234, PlannedIndividualMaterialID 3640240, ActualIndividualMaterialID 3640246, FirstAdditionalInformationText 3640252, SecondAdditionalInformationText 3640258 and ThirdAdditionalInformationText 3640264.

The ID 364078 attribute is a MaterialnspectionSubsetOperationInspectionActivityID 364082 datatype. The ID 364078 attribute has a cardinality of one 364080 meaning that for each instance of the InspectionActivity 364074 entity there is one ID 364078 attribute.

The Description 364084 attribute is a SHORT_Description 364088 datatype. The Description 364084 attribute has a cardinality of zero or one 364086 meaning that for each instance of the InspectionActivity 364074 entity there may be one Description 364084 attribute.

The InspectionSpecificationID 364090 attribute is an InspectionSpecificationID 364094 datatype. The InspectionSpecificationID 364090 attribute has a cardinality of zero or one 364092 meaning that for each instance of the InspectionActivity 364074 entity there may be one InspectionSpecificationID 364090 attribute.

The InspectionSpecificationPlantID 364096 attribute is a PlantID 3640100 datatype. The InspectionSpecificationPlantID 364096 attribute has a cardinality of zero or one 364098 meaning that for each instance of the InspectionActivity 364074 entity there may be one InspectionSpecificationPlantID 364096 attribute.

The InspectionSpecificationVersionID 3640102 attribute is a VersionID 3640106 datatype. The InspectionSpecificationVersionID 3640102 attribute has a cardinality of zero or one 3640104 meaning that for each instance of the InspectionActivity 364074 entity there may be one InspectionSpecificationVersionID 3640102 attribute.

The LifeCycleStatusCode 3640108 attribute is an InspectionActivityLifeCycleStatusCode 3640112 datatype. The LifeCycleStatusCode 3640108 attribute has a cardinality of one 3640110 meaning that for each instance of the InspectionActivity 364074 entity there is one LifeCycleStatusCode 3640108 attribute.

The LifeCycleStatusName 3640114 attribute is a MEDIUM_Name 3640118 datatype. The LifeCycleStatusName 3640114 attribute has a cardinality of zero or one 3640116 meaning that for each instance of the InspectionActivity 364074 entity there may be one LifeCycleStatusName 3640114 attribute.

The RequiredIndicator 3640120 attribute is an Indicator 3640124 datatype. The RequiredIndicator 3640120 attribute has a cardinality of one 3640122 meaning that for each instance of the InspectionActivity 364074 entity there is one RequiredIndicator 3640120 attribute.

The LongTermInspectionIndicator 3640126 attribute is an Indicator 3640130 datatype. The LongTermInspectionIndicator 3640126 attribute has a cardinality of one 3640128 meaning that for each instance of the InspectionActivity 364074 entity there is one LongTermInspectionIndicator 3640126 attribute.

The InspectionSampleSizeDeterminationAndValuationRuleID 3640132 attribute is an InspectionSampleSizeDeterminationAndValuationRuleID 3640136 datatype. The InspectionSampleSizeDeterminationAndValuationRuleID 3640132 attribute has a cardinality of one 3640134 meaning that for each instance of the InspectionActivity 364074 entity there is one InspectionSampleSizeDeterminationAndValuationRuleID 3640132 attribute.

The InspectionSampleSizeDeterminationAndValuationRuleDescription 3640138 attribute is a SHORT_Description 3640142 datatype. The InspectionSampleSizeDeterminationAndValuationRuleDescription 3640138 attribute has a cardinality of zero or one 3640140 meaning that for each instance of the InspectionActivity 364074 entity there may be one InspectionSampleSizeDeterminationAndValuationRuleDescription 3640138 attribute.

The SampleSizeQuantity 3640144 attribute is a Quantity 3640148 datatype. The SampleSizeQuantity 3640144 attribute has a cardinality of one 3640146 meaning that for each instance of the InspectionActivity 364074 entity there is one SampleSizeQuantity 3640144 attribute.

The SampleDrawingQuantity 3640150 attribute is a Quantity 3640154 datatype. The SampleDrawingQuantity 3640150 attribute has a cardinality of one 3640152 meaning that for each instance of the InspectionActivity 364074 entity there is one SampleDrawingQuantity 3640150 attribute.

The SingleValueResultRecordingRequiredIndicator 3640156 attribute is an Indicator 3640160 datatype. The SingleValueResultRecordingRequiredIndicator 3640156 attribute has a cardinality of one 3640158 meaning that for each instance of the InspectionActivity 364074 entity there is one SingleValueResultRecordingRequiredIndicator 3640156 attribute.

The MeasureResultRecordingRequiredIndicator 3640162 attribute is an Indicator 3640166 datatype. The MeasureResultRecordingRequiredIndicator 3640162 attribute has a cardinality of one 3640164 meaning that for each instance of the InspectionActivity 364074 entity there is one MeasureResultRecordingRequiredIndicator 3640162 attribute.

The QualityIssueCategoryResultRecordingRequiredIndicator 3640168 attribute is an Indicator 3640172 datatype. The QualityIssueCategoryResultRecordingRequiredIndicator 3640168 attribute has a cardinality of one 3640170 meaning that for each instance of the InspectionActivity 364074 entity there is one QualityIssueCategoryResultRecordingRequiredIndicator 3640168 attribute.

The InspectedNumberValueResultRecordingRequiredIndicator 3640174 attribute is an Indicator 3640178 datatype. The InspectedNumberValueResultRecordingRequiredIndicator 3640174 attribute has a cardinality of one 3640176 meaning that for each instance of the InspectionActivity 364074 entity there is one InspectedNumberValueResultRecordingRequiredIndicator 3640174 attribute.

The AcceptanceStatusCodeResultRecordingRequiredIndicator 3640180 attribute is an Indicator 3640184 datatype. The AcceptanceStatusCodeResultRecordingRequiredIndicator 3640180 attribute has a cardinality of one 3640182 meaning that for each instance of the InspectionActivity 364074 entity there is one AcceptanceStatusCodeResultRecordingRequiredIndicator 3640180 attribute.

The Measure 3640186 attribute is a Measure 3640190 datatype. The Measure 3640186 attribute has a cardinality of zero or one 3640188 meaning that for each instance of the InspectionActivity 364074 entity there may be one Measure 3640186 attribute.

The MeasureTypeCode 3640192 attribute is a MeasureTypeCode 3640196 datatype. The MeasureTypeCode 3640192 attribute has a cardinality of zero or one 3640194 meaning that for each instance of the InspectionActivity 364074 entity there may be one MeasureTypeCode 3640192 attribute.

The LowerToleranceMeasure 3640198 attribute is a Measure 3640202 datatype. The LowerToleranceMeasure 3640198 attribute has a cardinality of zero or one 3640200 meaning that for each instance of the InspectionActivity 364074 entity there may be one LowerToleranceMeasure 3640198 attribute.

The UpperToleranceMeasure 3640204 attribute is a Measure 3640208 datatype. The UpperToleranceMeasure 3640204 attribute has a cardinality of zero or one 3640206 meaning that for each instance of the InspectionActivity 364074 entity there may be one UpperToleranceMeasure 3640204 attribute.

The CharacteristicAttributeQualityIssueCategoryCatalogueID 3640210 attribute is a QualityIssueCategoryCatalogueID 3640214 datatype. The CharacteristicAttributeQualityIssueCategoryCatalogueID 3640210 attribute has a cardinality of zero or one 3640212 meaning that for each instance of the InspectionActivity 364074 entity there may be one CharacteristicAttributeQualityIssueCategoryCatalogueID 3640210 attribute.

The CharacteristicAttributeParentQualityIssueCategoryID 3640216 attribute is a QualityIssueCategoryID 3640220 datatype. The CharacteristicAttributeParentQualityIssueCategoryID 3640216 attribute has a cardinality of zero or one 3640218 meaning that for each instance of the InspectionActivity 364074 entity there may be one CharacteristicAttributeParentQualityIssueCategoryID 3640216 attribute.

The CharacteristicAttributeParentQualityIssueCategoryName 3640222 attribute is a MEDIUM_Name 3640226 datatype. The CharacteristicAttributeParentQualityIssueCategoryName 3640222 attribute has a cardinality of zero or one 3640224 meaning that for each instance of the InspectionActivity 364074 entity there may be one CharacteristicAttributeParentQualityIssueCategoryName 3640222 attribute.

The CharacteristicAttributeQualityIssueCategoryFilterCode 3640228 attribute is an IssueCategoryFilterCode 3640232 datatype. The CharacteristicAttributeQualityIssueCategoryFilterCode 3640228 attribute has a cardinality of zero or one 3640230 meaning that for each instance of the InspectionActivity 364074 entity there may be one CharacteristicAttributeQualityIssueCategoryFilterCode 3640228 attribute.

The FindingReportedIndicator 3640234 attribute is an Indicator 3640238 datatype. The FindingReportedIndicator 3640234 attribute has a cardinality of zero or one 3640236 meaning that for each instance of the InspectionActivity 364074 entity there may be one FindingReportedIndicator 3640234 attribute.

The PlannedIndividualMaterialID 3640240 attribute is a ProductID 3640244 datatype. The PlannedIndividualMaterialID 3640240 attribute has a cardinality of zero or one 3640242 meaning that for each instance of the InspectionActivity 364074 entity there may be one PlannedIndividualMaterialID 3640240 attribute.

The ActualIndividualMaterialID 3640246 attribute is a ProductID 3640250 datatype. The ActualIndividualMaterialID 3640246 attribute has a cardinality of zero or one 3640248 meaning that for each instance of the InspectionActivity 364074 entity there may be one ActualIndividualMaterialID 3640246 attribute.

The FirstAdditionalInformationText 3640252 attribute is a LANGUAGEINDEPENDENT_MEDIUM_Text 3640256 datatype. The FirstAdditionalInformationText 3640252 attribute has a cardinality of zero or one 3640254 meaning that for each instance of the InspectionActivity 364074 entity there may be one FirstAdditionalInformationText 3640252 attribute.

The SecondAdditionalInformationText 3640258 attribute is a LANGUAGEINDEPENDENT_MEDIUM_Text 3640262 datatype. The SecondAdditionalInformationText 3640258 attribute has a cardinality of zero or one 3640260 meaning that for each instance of the InspectionActivity 364074 entity there may be one SecondAdditionalInformationText 3640258 attribute.

The ThirdAdditionalInformationText 3640264 attribute is a LANGUAGEINDEPENDENT_MEDIUM_Text 3640268 datatype. The ThirdAdditionalInformationText 3640264 attribute has a cardinality of zero or one 3640266 meaning that for each instance of the InspectionActivity 364074 entity there may be one ThirdAdditionalInformationText 3640264 attribute.

The Result 3640270 package includes a Result 3640272 entity.

The Result 3640272 entity has a cardinality of zero or n 3640274 meaning that for each instance of the InspectionActivity 364074 entity there may be one or more Result 3640272 entities. The Result 3640272 entity includes various attributes, namely ID 3640276, Measure 3640282, CharacteristicAttributeQualityIssueCategoryID 3640288, CharacteristicAttributeQualityIssueCategoryName 3640294, InspectedNumberValue 3640300, DefectNumberValue 3640306, AcceptanceStatusCode 3640312, ExceptionIndicator 3640318 and Comment 3640324.

The ID 3640276 attribute is a MaterialnspectionSubsetOperationInspectionActivityResultID 3640280 datatype. The ID 3640276 attribute has a cardinality of one 3640278 meaning that for each instance of the Result 3640272 entity there is one ID 3640276 attribute.

The Measure 3640282 attribute is a Measure 3640286 datatype. The Measure 3640282 attribute has a cardinality of zero or one 3640284 meaning that for each instance of the Result 3640272 entity there may be one Measure 3640282 attribute.

The CharacteristicAttributeQualityIssueCategoryID 3640288 attribute is a QualityIssueCategoryID 3640292 datatype. The CharacteristicAttributeQualityIssueCategoryID 3640288 attribute has a cardinality of zero or one 3640290 meaning that for each instance of the Result 3640272 entity there may be one CharacteristicAttributeQualityIssueCategoryID 3640288 attribute.

The CharacteristicAttributeQualityIssueCategoryName 3640294 attribute is a MEDIUM_Name 3640298 datatype. The CharacteristicAttributeQualityIssueCategoryName 3640294 attribute has a cardinality of zero or one 3640296 meaning that for each instance of the Result 3640272 entity there may be one CharacteristicAttributeQualityIssueCategoryName 3640294 attribute.

The InspectedNumberValue 3640300 attribute is a NumberValue 3640304 datatype. The InspectedNumberValue 3640300 attribute has a cardinality of zero or one 3640302 meaning that for each instance of the Result 3640272 entity there may be one InspectedNumberValue 3640300 attribute.

The DefectNumberValue 3640306 attribute is a NumberValue 3640310 datatype. The DefectNumberValue 3640306 attribute has a cardinality of zero or one 3640308 meaning that for each instance of the Result 3640272 entity there may be one DefectNumberValue 3640306 attribute.

The AcceptanceStatusCode 3640312 attribute is an AcceptanceStatusCode 3640316 datatype. The AcceptanceStatusCode 3640312 attribute has a cardinality of zero or one 3640314 meaning that for each instance of the Result 3640272 entity there may be one AcceptanceStatusCode 3640312 attribute.

The ExceptionIndicator 3640318 attribute is an Indicator 3640322 datatype. The ExceptionIndicator 3640318 attribute has a cardinality of zero or one 3640320 meaning that for each instance of the Result 3640272 entity there may be one ExceptionIndicator 3640318 attribute.

The Comment 3640324 attribute is a LANGUAGEINDEPENDENT_Comment 3640328 datatype. The Comment 3640324 attribute has a cardinality of zero or one 3640326 meaning that for each instance of the Result 3640272 entity there may be one Comment 3640324 attribute.

The Log 3640330 package is a Log 3640336 datatype. The Log 3640330 package includes a Log 3640332 entity.

The Log 3640332 entity has a cardinality of one 3640334 meaning that for each instance of the MaterialInspectionSubsetOperationInspectionActivityByIDResponseMessage_sync 364002 entity there is one Log 3640332 entity.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection. ChangeStateID is an identifier of the change state of a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset. TypeCode is a coded representation of the type of a subset. MaterialInspectionSampleID is a unique identifier for a material inspection sample. Description is a description of the subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation. Description is a description of the material inspection operation.

InspectionActivity Package

The InspectionActivity package groups the MaterialInspectionSubsetOperationInspectionActivity with its packages. Result contains the entity InspectionActivity. InspectionActivity is a detailed work instruction how an inspection has to be performed. ID is an identifier of an inspection activity. Description is a description of the inspection activity. InspectionSpecificationID is an identifier of the inspection specification. InspectionSpecificationPlantID is an identifier of the plant of the inspection specification. InspectionSpecificationVersionID is an identifier of the version of the inspection specification. LifeCycleStatusCode is a coded representation of the current step in the life cycle of an inspection activity. LifeCycleStatusName, which can be optional, is a name of the current step in the life cycle of an inspection activity. RequiredIndicator is an indicator to show that processing of the inspection activity is required. LongTermInspectionIndicator is an indicator for an inspection activity to which results can be created even when material inspection is decided.

InspectionSampleSizeDeterminationAndValuationRuleID is an identifier for a rule that determines and valuates the sample size for an inspection. The inspection sample size determination and valuation rule is used in the context of an inspection and provides information about how the sample size is determined (fixed sample size, percentage of Lot size quantity, or using a sampling scheme) and later on valuated.

InspectionSampleSizeDeterminationAndValuationRuleDescription is a description of the inspection sample size determination and valuation rule. SampleSizeQuantity is a sample size for a sampling inspection. The sample size describes how many units are to be taken from a quantity of discrete units of the material to be inspected. The sample size is either determined using a sample size determination rule or it is fixed.

SampleDrawingQuantity is a sample-drawing quantity that is to be taken from every unit of the sample size. In general, the complete unit that has been taken is examined in the discrete industry. In the process industry, it is often the case that only a partial quantity of the unit (for example, barrel, sack, bottle) that has been taken is examined in the material inspection. This partial quantity or sample-drawing quantity is specified in the element SampleDrawingQuantity and is drawn from the unit that has been taken.

SingleValueResultRecordingRequiredIndicator is an indicator to show that for the inspection activity for each unit a result has to be recorded. MeasureResultRecordingRequiredIndicator is an indicator to show that for the inspection activity result a measure has to be recorded. QualityIssueCategoryResultRecordingRequiredIndicator is an indicator to show that for the inspection activity result a quality issue category has to be recorded. InspectedNumberValueResultRecordingRequiredIndicator is an indicator to show that for the inspection activity result a number value has to be recorded. AcceptanceStatusCodeResultRecordingRequiredIndicator is an indicator to show that for the inspection activity result an acceptance status code has to be recorded. Measure, which can be optional, is a physical measurement of the inspection activity planned value.

MeasureTypeCode is a coded representation of a type of measure that is based on the measurable characteristic of an object or physical phenomenon. LowerToleranceMeasure, which can be optional, is a physical measurement of the inspection activity lower tolerance. UpperToleranceMeasure, which can be optional, is a physical measurement of the inspection activity upper tolerance. CharacteristicAttributeQualityIssueCategoryCatalogueID, which can be optional, is an identifier of a QualityIssueCategoryCatalogue of type CharacteristicAttribute. CharacteristicAttributeParentQualityIssueCategoryID, which can be optional, is an identifier of a parent category of a QualityIssueCategoryCatalogue of type CharacteristicAttribute.CharacteristicAttributeParentQualityIssueCategoryName is a name of a parent category of a QualityIssueCategoryCatalogue of type CharacteristicAttribute. CharacteristicAttributeQualityIssueCategoryFilterCode, which can be optional, is a coded representation of the filter for categories of quality issues of type CharacteristicAttribute.

FindingReportedIndicator is an indicator that shows that a finding is reported. PlannedIndividualMaterialID, which can be optional, is a unique identifier of a technical asset which is planned to be used for the inspection. ActualIndividualMaterialID, which can be optional, is a unique identifier of a technical asset which was used for the inspection.

FirstAdditionalInformationText, which can be optional, is a first language independent additional information for an inspection activity. In some implementations, the length can be restricted to 10 characters. SecondAdditionalInformationText, which can be optional, is a second language independent additional information for, an inspection activity. In some implementations, the length can be restricted to 20 characters. ThirdAdditionalInformationText, which can be optional, is a third language independent additional information for an inspection activity.

Result Package

The Result package contains information of MaterialInspectionSubsetOperationInspectionActivityResult.

Result

Result is an expected result for an inspection activity of the examined subset. ID is an identifier of an inspection activity result. Measure, which can be optional, is a physical measurement of the inspection activity result value. CharacteristicAttributeQualityIssueCategoryID, which can be optional, is an identifier of a category of a QualityIssueCategoryCatalogue of type CharacteristicAttribute. CharacteristicAttributeQualityIssueCategoryName, which can be optional, is a name of a QualityIssueCategoryCatalogue of type CharacteristicAttribute. InspectedNumberValue, which can be optional, is a number of inspected units. DefectNumberValue, which can be optional, is a number of defects. AcceptanceStatusCode is a valuation of the inspection with respect to its acceptance or rejection. ExceptionIndicator is an indicator to show that the result is an exception. In some instances, if the indicator is TRUE, the result will not be considered and an additional result has to be recorded. In some instances, length can be limited up to 40 characters.

Message Data Type

The message data type MaterialInspectionSubsetOperationInspectionActivityResultRecordingRequestMessage_sync contains the business information that is relevant for sending a business document in a message and the MaterialInspection included in the business document. FIGS. 370-1 through 370-5 show a MaterialInspectionSubsetOperationInspectionActivityResultRecordingRequestMessage 370000 package. The MaterialInspectionSubsetOperationInspectionActivityResultRecordingRequestMessage 370000 package is a MaterialInspectionSubsetOperationInspectionActivityResultRecordingRequestMessage_sync 370004 datatype. The MaterialInspectionSubsetOperationInspectionActivityResultRecordingRequestMessage 370000 package includes a MaterialInspectionSubsetOperationInspectionActivityResultRecordingRequestMessage_sync 370002 entity. The MaterialInspectionSubsetOperationInspectionActivityResultRecordingRequestMessage 370000 package includes various packages, namely MessageHeader 370006 and MaterialInspection 370014.

The MessageHeader 370006 package is a BasicBusinessDocumentMessageHeader 370012 datatype. The MessageHeader 370006 package includes a MessageHeader 370008 entity.

The MessageHeader 370008 entity has a cardinality of zero or one 370010 meaning that for each instance of the MaterialInspectionSubsetOperationInspectionActivityResultRecordingRequestMessage_sync 370002 entity there may be one MessageHeader 370008 entity.

The MaterialInspection 370014 package includes a MaterialInspection 370016 entity. The MaterialInspection 370014 package includes a Subset 370032 package.

The MaterialInspection 370016 entity has a cardinality of one 370018 meaning that for each instance of the MaterialInspectionSubsetOperationInspectionActivityResultRecordingRequestMessage_sync 370002 entity there is one MaterialInspection 370016 entity. The MaterialInspection 370016 entity includes various attributes, namely ID 370020 and ChangeStateID 370026.

The ID 370020 attribute is a MaterialInspectionID 370024 datatype. The ID 370020 attribute has a cardinality of one 370022 meaning that for each instance of the MaterialInspection 370016 entity there is one ID 370020 attribute.

The ChangeStateID 370026 attribute is a ChangeStateID 370030 datatype. The ChangeStateID 370026 attribute has a cardinality of one 370028 meaning that for each instance of the MaterialInspection 370016 entity there is one ChangeStateID 370026 attribute.

The Subset 370032 package includes a Subset 370034 entity. The Subset 370032 package includes an Operation 370044 package.

The Subset 370034 entity has a cardinality of one 370036 meaning that for each instance of the MaterialInspection 370016 entity there is one Subset 370034 entity. The Sub-set 370034 entity includes an ID 370038 attribute.

The ID 370038 attribute is an InspectionSubsetID 370042 datatype. The ID 370038 attribute has a cardinality of one 370040 meaning that for each instance of the Subset 370034 entity there is one ID 370038 attribute.

The Operation 370044 package includes an Operation 370046 entity. The Operation 370044 package includes an InspectionActivity 370056 package.

The Operation 370046 entity has a cardinality of one 370048 meaning that for each instance of the Subset 370034 entity there is one Operation 370046 entity. The Operation 370046 entity includes an ID 370050 attribute.

The ID 370050 attribute is a MaterialInspectionSubsetOperationID 370054 datatype. The ID 370050 attribute has a cardinality of one 370052 meaning that for each instance of the Operation 370046 entity there is one ID 370050 attribute.

The InspectionActivity 370056 package includes an InspectionActivity 370058 entity. The InspectionActivity 370056 package includes a Result 370074 package.

The InspectionActivity 370058 entity has a cardinality of one 370060 meaning that for each instance of the Operation 370046 entity there is one InspectionActivity 370058 entity. The InspectionActivity 370058 entity includes various attributes, namely ID 370062 and ActualIndividualMaterialID 370068.

The ID 370062 attribute is a MaterialnspectionSubsetOperationInspectionActivityID 370066 datatype. The ID 370062 attribute has a cardinality of one 370064 meaning that for each instance of the InspectionActivity 370058 entity there is one ID 370062 attribute.

The ActualIndividualMaterialID 370068 attribute is a ProductID 370072 datatype. The ActualIndividualMaterialID 370068 attribute has a cardinality of zero or one 370070 meaning that for each instance of the InspectionActivity 370058 entity there may be one ActualIndividualMaterialID 370068 attribute.

The Result 370074 package includes a Result 370076 entity.

The Result 370076 entity has a cardinality of one or n 370078 meaning that for each instance of the InspectionActivity 370058 entity there are one or more Result 370076 entities. The Result 370076 entity includes various attributes, namely ID 370080, Measure 370086, CharacteristicAttributeQualityIssueCategoryID 370092, InspectedNumberValue 370098, DefectNumberValue 3700104, AcceptanceStatusCode 3700110, ExceptionIndicator 3700116, Comment 3700122 and @actionCode 3700128.

The ID 370080 attribute is a MaterialnspectionSubsetOperationInspectionActivityResultID 370084 datatype. The ID 370080 attribute has a cardinality of one 370082 meaning that for each instance of the Result 370076 entity there is one ID 370080 attribute.

The Measure 370086 attribute is a Measure 370090 datatype. The Measure 370086 attribute has a cardinality of zero or one 370088 meaning that for each instance of the Result 370076 entity there may be one Measure 370086 attribute.

The CharacteristicAttributeQualityIssueCategoryID 370092 attribute is a QualityIssueCategoryID 370096 datatype. The CharacteristicAttributeQualityIssueCategoryID 370092 attribute has a cardinality of zero or one 370094 meaning that for each instance of the Result 370076 entity there may be one CharacteristicAttributeQualityIssueCategoryID 370092 attribute.

The InspectedNumberValue 370098 attribute is a NumberValue 3700102 datatype. The InspectedNumberValue 370098 attribute has a cardinality of zero or one 3700100 meaning that for each instance of the Result 370076 entity there may be one InspectedNumberValue 370098 attribute.

The DefectNumberValue 3700104 attribute is a NumberValue 3700108 datatype. The DefectNumberValue 3700104 attribute has a cardinality of zero or one 3700106 meaning that for each instance of the Result 370076 entity there may be one DefectNumberValue 3700104 attribute.

The AcceptanceStatusCode 3700110 attribute is an AcceptanceStatusCode 3700114 datatype. The AcceptanceStatusCode 3700110 attribute has a cardinality of zero or one 3700112 meaning that for each instance of the Result 370076 entity there may be one AcceptanceStatusCode 3700110 attribute.

The ExceptionIndicator 3700116 attribute is an Indicator 3700120 datatype. The ExceptionIndicator 3700116 attribute has a cardinality of zero or one 3700118 meaning that for each instance of the Result 370076 entity there may be one ExceptionIndicator 3700116 attribute.

The Comment 3700122 attribute is a LANGUAGEINDEPENDENT_Comment 3700126 datatype. The Comment 3700122 attribute has a cardinality of zero or one 3700124 meaning that for each instance of the Result 370076 entity there may be one Comment 3700122 attribute.

The @actionCode 3700128 attribute is an ActionCode 3700132 datatype. The @actionCode 3700128 attribute has a cardinality of zero or one 3700130 meaning that for each instance of the Result 370076 entity there may be one @actionCode 3700128 attribute.

MessageHeader Package

A MessageHeader package groups the business information that is relevant for sending a business document in a message.

MessageHeader

A MessageHeader groups business information from the perspective of the sending application:

Information to identify the business document in a message

MaterialInspection Package

The MaterialInspection package groups the MaterialInspection with its packages.

MaterialInspection

A document that describes the execution of an inspection for a particular material, and that is used to record this inspection.

Material Inspection

ID is a unique identifier for a material inspection. ChangeStateID is an identifier of the change state of a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation.

InspectionActivity Package

The InspectionActivity package groups the MaterialInspectionSubsetOperationInspectionActivity with its packages. InspectionActivity is a detailed work instruction how an inspection has to be performed. ID is an identifier of an inspection activity. ActualIndividualMaterialID, which can be optional, is a unique identifier of a technical asset which was used for the inspection.

Result Package

The Result package contains information of MaterialInspectionSubsetOperationInspectionActivityResult.

Result

Result is an expected result for an inspection activity of the examined subset. ID is an Identifier of an inspection activity result. If a new result has to be created, an internal ID will be provided. Measure, which can be optional, is a physical measurement of the inspection activity result value. CharacteristicAttributeQualityIssueCategoryID, which can be optional, is an identifier of a category of a QualityIssueCategoryCatalogue of type CharacteristicAttribute. InspectedNumberValue, which can be optional, is a number of inspected units. DefectNumberValue, which can be optional, is a number of defects. AcceptanceStatusCode is a valuation of the inspection with respect to its acceptance or rejection. In some implementations, the Code 'AJ' (Pending) is not supported.

ExceptionIndicator is an indicator to show that the result is an exception. If the indicator is TRUE, the result will not be considered and an additional result has to be recorded. In some cases, length can be limited up to 40 characters.

@actionCode, which can be optional, defines the action to be performed. In some implementations, the number of results is restricted by the SampleSizeQuantity of the entity InspectionActivity. If there is more than one result to be recorded (SingleValueResultRecordingRequiredIndicator is TRUE), every result has to have either a Measure, or QualityIssueCategoryID, or DefectNumberValue, or AcceptanceStatusCode provided, depending on which corresponding indicator is TRUE.

Message Data Type

The message data type MaterialInspectionSubsetOperationInspectionActivityResultRecordingConfirmationMessage_sync contains the business information that is relevant for sending a business document in a message, the MaterialInspection included in the business document, and the Log. The MaterialInspection package groups the MaterialInspection with its packages. FIGS. 369-1 through 369-3 show a MaterialInspectionSubsetOperationInspectionActivityResultRecordingConfirmationMessage 369000 package. The MaterialInspectionSubsetOperationInspectionActivityResultRecordingConfirmationMessage 369000 package is a MaterialInspectionSubsetOperationInspectionActivityResultRecordingConfirmationMessage__sync 369004 datatype. The MaterialInspectionSubsetOperationInspectionActivityResultRecordingConfirmationMessage 369000 package includes a MaterialInspectionSubsetOperationInspectionActivityResultRecordingConfirmationMessage_sync 369002 entity. The MaterialInspectionSubsetOperationInspectionActivityResultRecordingConfirmationMessage 369000 package includes various packages, namely MessageHeader 369006, MaterialInspection 369014 and Log 369074.

The MessageHeader 369006 package is a BasicBusinessDocumentMessageHeader 369012 datatype. The MessageHeader 369006 package includes a MessageHeader 369008 entity.

The MessageHeader 369008 entity has a cardinality of zero or one 369010 meaning that for each instance of the MaterialInspectionSubsetOperationInspectionActivityResultRecordingConfirmationMessage_sync 369002 entity there may be one MessageHeader 369008 entity.

The MaterialInspection 369014 package includes a MaterialInspection 369016 entity. The MaterialInspection 369014 package includes a Subset 369026 package.

The MaterialInspection 369016 entity has a cardinality of zero or one 369018 meaning that for each instance of the MaterialInspectionSubsetOperationInspectionActivityResultRecordingConfirmationMessage_sync 369002 entity there may be one MaterialInspection 369016 entity. The MaterialInspection 369016 entity includes an ID 369020 attribute.

The ID 369020 attribute is a MaterialInspectionID 369024 datatype. The ID 369020 attribute has a cardinality of one 369022 meaning that for each instance of the MaterialInspection 369016 entity there is one ID 369020 attribute.

The Subset 369026 package includes a Subset 369028 entity. The Subset 369026 package includes an Operation 369038 package.

The Subset 369028 entity has a cardinality of one 369030 meaning that for each instance of the MaterialInspection 369016 entity there is one Subset 369028 entity. The Sub-set 369028 entity includes an ID 369032 attribute.

The ID 369032 attribute is an InspectionSubsetID 369036 datatype. The ID 369032 attribute has a cardinality of one 369034 meaning that for each instance of the Subset 369028 entity there is one ID 369032 attribute.

The Operation 369038 package includes an Operation 369040 entity. The Operation 369038 package includes an InspectionActivity 369050 package.

The Operation 369040 entity has a cardinality of one 369042 meaning that for each instance of the Subset 369028 entity there is one Operation 369040 entity. The Operation 369040 entity includes an ID 369044 attribute.

The ID 369044 attribute is a MaterialInspectionSubset-OperationID 369048 datatype. The ID 369044 attribute has a cardinality of one 369046 meaning that for each instance of the Operation 369040 entity there is one ID 369044 attribute.

The InspectionActivity 369050 package includes an InspectionActivity 369052 entity.

The InspectionActivity 369052 entity has a cardinality of one 369054 meaning that for each instance of the Operation 369040 entity there is one InspectionActivity 369052 entity. The InspectionActivity 369052 entity includes various attributes, namely ID 369056, LifeCycleStatusCode 369062 and LifeCycleStatusName 369068.

The ID 369056 attribute is a MaterialnspectionSubsetOperationInspectionActivityID 369060 datatype. The ID 369056 attribute has a cardinality of one 369058 meaning that for each instance of the InspectionActivity 369052 entity there is one ID 369056 attribute.

The LifeCycleStatusCode 369062 attribute is an InspectionActivityLifeCycleStatusCode 369066 datatype. The LifeCycleStatusCode 369062 attribute has a cardinality of one 369064 meaning that for each instance of the Inspection-Activity 369052 entity there is one LifeCycleStatusCode 369062 attribute.

The LifeCycleStatusName 369068 attribute is a MEDIUM_Name 369072 datatype. The LifeCycleStatus-Name 369068 attribute has a cardinality of zero or one 369070 meaning that for each instance of the InspectionActivity 369052 entity there may be one LifeCycleStatusName 369068 attribute.

The Log 369074 package is a Log 369080 datatype. The Log 369074 package includes a Log 369076 entity.

The Log 369076 entity has a cardinality of one 369078 meaning that for each instance of the MaterialInspectionSubsetOperationInspectionActivityResultRecordingConfirmationMessage_sync 369002 entity there is one Log 369076 entity.

MaterialInspection

MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Operation Package

The Operation package groups the MaterialInspectionSubsetOperation with its packages. The activity associated with an inspection of one or more inspection specifications with specific technical assets at a specific work center. ID is an identifier of a material inspection operation.

InspectionActivity Package

The InspectionActivity package groups information of the MaterialInspectionSubsetOperationInspectionActivity. A detailed work instruction how an inspection is performed. ID is an identifier of an inspection activity. LifeCycleStatusCode is a coded representation of the current step in the life cycle of an inspection activity. LifeCycleStatusName, which can be optional, is a name of the current step in the life cycle of an inspection activity.

Message Data Type

The message data type MaterialInspectionSubsetOperationInspectionActivityFindingCreateRequestMessage_sync contains the business information that is relevant for sending a business document in a message. The MaterialInspection included in the business document. FIGS. 368-1 through 368-6 show a MaterialInspectionSubsetOperationInspectionActivityFindingCreateRequestMessage 368000 package. The MaterialInspectionSubsetOperationInspectionActivityFindingCreateRequestMessage 368000 package is a MaterialInspectionSubsetOperationInspectionActivityFindingCreateRequestMessage_sync 368004 datatype. The MaterialInspectionSubsetOperationInspectionActivityFindingCreateRequestMessage 368000 package includes a MaterialInspectionSubsetOperationInspectionActivityFindingCreateRequestMessage_sync 368002 entity. The MaterialInspectionSubsetOperationInspectionActivityFinding CreateRequestMessage 368000 package includes various packages, namely MessageHeader 368006 and MaterialInspection 368014.

The MessageHeader 368006 package is a BasicBusinessDocumentMessageHeader 368012 datatype. The MessageHeader 368006 package includes a MessageHeader 368008 entity.

The MessageHeader 368008 entity has a cardinality of zero or one 368010 meaning that for each instance of the MaterialInspectionSubsetOperationInspectionActivityFindingCreateRequestMessage_sync 368002 entity there may be one MessageHeader 368008 entity.

The MaterialInspection 368014 package includes a MaterialInspection 368016 entity. The MaterialInspection 368014 package includes a Subset 368026 package.

The MaterialInspection 368016 entity has a cardinality of one 368018 meaning that for each instance of the MaterialInspectionSubsetOperationInspectionActivityFindingCreateRequestMessage_sync 368002 entity there is one MaterialInspection 368016 entity. The MaterialInspection 368016 entity includes an ID 368020 attribute.

The ID 368020 attribute is a MaterialInspectionID 368024 datatype. The ID 368020 attribute has a cardinality of one 368022 meaning that for each instance of the MaterialInspection 368016 entity there is one ID 368020 attribute.

The Subset 368026 package includes a Subset 368028 entity. The Subset 368026 package includes an Operation 368038 package.

The Subset 368028 entity has a cardinality of one 368030 meaning that for each instance of the MaterialInspection 368016 entity there is one Subset 368028 entity. The Sub-set 368028 entity includes an ID 368032 attribute.

The ID 368032 attribute is an InspectionSubsetID 368036 datatype. The ID 368032 attribute has a cardinality of one 368034 meaning that for each instance of the Subset 368028 entity there is one ID 368032 attribute.

The Operation 368038 package includes an Operation 368040 entity. The Operation 368038 package includes an InspectionActivity 368050 package.

The Operation 368040 entity has a cardinality of one 368042 meaning that for each instance of the Subset 368028 entity there is one Operation 368040 entity. The Operation 368040 entity includes an ID 368044 attribute.

The ID 368044 attribute is a MaterialInspectionSubsetOperationID 368048 datatype. The ID 368044 attribute has a cardinality of one 368046 meaning that for each instance of the Operation 368040 entity there is one ID 368044 attribute.

The InspectionActivity 368050 package includes an InspectionActivity 368052 entity. The InspectionActivity 368050 package includes a Finding 368062 package.

The InspectionActivity 368052 entity has a cardinality of one 368054 meaning that for each instance of the Operation 368040 entity there is one InspectionActivity 368052 entity. The InspectionActivity 368052 entity includes an ID 368056 attribute.

The ID 368056 attribute is a MaterialInspectionSubsetOperationInspectionActivityID 368060 datatype. The ID 368056 attribute has a cardinality of one 368058 meaning that for each instance of the InspectionActivity 368052 entity there is one ID 368056 attribute.

The Finding 368062 package includes a Finding 368064 entity.

The Finding 368064 entity has a cardinality of one 368066 meaning that for each instance of the InspectionActivity 368052 entity there is one Finding 368064 entity. The Finding 368064 entity includes various attributes, namely DefectTypeQualityIssueCategoryCatalogueID 368068, DefectTypeParentQualityIssueCategoryID 368074, DefectTypeQualityIssueCategoryID 368080, DefectLocationQualityIssueCategoryCatalogueID 368086, DefectLocationParentQualityIssueCategoryID 368092, DefectLocationQualityIssueCategoryID 368098, CauseQualityIssueCategoryCatalogueID 3680104, CauseParentQualityIssueCategoryID 3680110, CauseQualityIssueCategoryID 3680116, DefectNumberValue 3680122, AffectedQuantity 3680128, Description 3680134, DefectClassCode 3680140, DefectWeightingClassCode 3680146 and SystematicIndicator 3680152.

The DefectTypeQualityIssueCategoryCatalogueID 368068 attribute is a QualityIssueCategoryCatalogueID 368072 datatype. The DefectTypeQualityIssueCategoryCatalogueID 368068 attribute has a cardinality of one 368070 meaning that for each instance of the Finding 368064 entity there is one DefectTypeQualityIssueCategoryCatalogueID 368068 attribute.

The DefectTypeParentQualityIssueCategoryID 368074 attribute is a QualityIssueCategoryID 368078 datatype. The DefectTypeParentQualityIssueCategoryID 368074 attribute has a cardinality of one 368076 meaning that for each instance of the Finding 368064 entity there is one DefectTypeParentQualityIssueCategoryID 368074 attribute.

The DefectTypeQualityIssueCategoryID 368080 attribute is a QualityIssueCategoryID 368084 datatype. The DefectTypeQualityIssueCategoryID 368080 attribute has a cardinality of one 368082 meaning that for each instance of the Finding 368064 entity there is one DefectTypeQualityIssueCategoryID 368080 attribute.

The DefectLocationQualityIssueCategoryCatalogueID 368086 attribute is a QualityIssueCategoryCatalogueID 368090 datatype. The DefectLocationQualityIssueCategoryCatalogueID 368086 attribute has a cardinality of zero or one 368088 meaning that for each instance of the Finding 368064 entity there may be one DefectLocationQualityIssueCategoryCatalogueID 368086 attribute.

The DefectLocationParentQualityIssueCategoryID 368092 attribute is a QualityIssueCategoryID 368096 datatype. The DefectLocationParentQualityIssueCategoryID 368092 attribute has a cardinality of zero or one 368094 meaning that for each instance of the Finding 368064 entity there may be one DefectLocationParentQualityIssueCategoryID 368092 attribute.

The DefectLocationQualityIssueCategoryID 368098 attribute is a QualityIssueCategoryID 3680102 datatype. The DefectLocationQualityIssueCategoryID 368098 attribute has a cardinality of zero or one 3680100 meaning that for each instance of the Finding 368064 entity there may be one DefectLocationQualityIssueCategoryID 368098 attribute.

The CauseQualityIssueCategoryCatalogueID 3680104 attribute is a QualityIssueCategoryCatalogueID 3680108 datatype. The CauseQualityIssueCategoryCatalogueID 3680104 attribute has a cardinality of zero or one 3680106 meaning that for each instance of the Finding 368064 entity there may be one CauseQualityIssueCategoryCatalogueID 3680104 attribute.

The CauseParentQualityIssueCategoryID 3680110 attribute is a QualityIssueCategoryID 3680114 datatype. The CauseParentQualityIssueCategoryID 3680110 attribute has a cardinality of zero or one 3680112 meaning that for each instance of the Finding 368064 entity there may be one CauseParentQualityIssueCategoryID 3680110 attribute.

The CauseQualityIssueCategoryID 3680116 attribute is a QualityIssueCategoryID 3680120 datatype. The CauseQualityIssueCategoryID 3680116 attribute has a cardinality of zero or one 3680118 meaning that for each instance of the Finding 368064 entity there may be one CauseQualityIssueCategoryID 3680116 attribute.

The DefectNumberValue 3680122 attribute is a NumberValue 3680126 datatype. The DefectNumberValue 3680122 attribute has a cardinality of zero or one 3680124 meaning that for each instance of the Finding 368064 entity there may be one DefectNumberValue 3680122 attribute.

The AffectedQuantity 3680128 attribute is a Quantity 3680132 datatype. The AffectedQuantity 3680128 attribute has a cardinality of zero or one 3680130 meaning that for each instance of the Finding 368064 entity there may be one AffectedQuantity 3680128 attribute.

The Description 3680134 attribute is a SHORT_Description 3680138 datatype. The Description 3680134 attribute has a cardinality of zero or one 3680136 meaning that for each instance of the Finding 368064 entity there may be one Description 3680134 attribute.

The DefectClassCode 3680140 attribute is a DefectClassCode 3680144 datatype. The DefectClassCode 3680140 attribute has a cardinality of zero or one 3680142 meaning that for each instance of the Finding 368064 entity there may be one DefectClassCode 3680140 attribute.

The DefectWeightingClassCode 3680146 attribute is a DefectWeightingClassCode 3680150 datatype. The DefectWeightingClassCode 3680146 attribute has a cardinality of zero or one 3680148 meaning that for each instance of the Finding 368064 entity there may be one DefectWeightingClassCode 3680146 attribute.

The SystematicIndicator 3680152 attribute is an Indicator 3680156 datatype. The SystematicIndicator 3680152 attribute has a cardinality of zero or one 3680154 meaning that for each instance of the Finding 368064 entity there may be one SystematicIndicator 3680152 attribute.

MaterialInspection Package

The MaterialInspection package groups the MaterialInspection with its packages.

MaterialInspection

MaterialInspection is a document that describes the execution of an inspection for a particular material, and that is used to record this inspection.

Material Inspection

ID is a unique identifier for a material inspection.

Subset Package

The Subset package groups the MaterialInspectionSubset with its packages.

Subset

Subset is a partial quantity of the total quantity to be inspected. In some cases it can also be the total quantity. ID is a unique identifier of a subset.

Operation Package

The Operation package groups the MaterialInspectionSubsetOperation with its packages. The activity associated with an inspection of one or more inspection specifications with specific technical assets at a specific work center. ID is an identifier of a material inspection operation.

InspectionActivity Package

The InspectionActivity package groups the MaterialInspectionSubsetOperationInspectionActivity with its packages. A detailed work instruction how an inspection is performed. ID is an identifier of an inspection activity.

Finding Package

The Finding package contains information of MaterialInspectionSubsetOperationInspectionActivityFinding.

Finding

Finding is a deviation (non-fulfillment of specified requirements) for an inspection activity of the examined subset.

DefectTypeQualityIssueCategoryCatalogueID is an identifier of a QualityIssueCategoryCatalogue of type Defect Type. DefectTypeParentQualityIssueCategoryID is an identifier of a parent category of a QualityIssueCategoryCatalogue of type Defect Type. DefectTypeQualityIssueCategoryID is an identifier of a category of a QualityIssueCategoryCatalogue of type Defect Type. DefectLocationQualityIssueCategoryCatalogueID, which can be optional, is an identifier of a QualityIssueCategoryCatalogue of type Defect Location. DefectLocationParentQualityIssueCategoryID, which can be optional, is an identifier of a parent category of a QualityIssueCategoryCatalogue of type Defect Location. DefectLocationQualityIssueCategoryID, which can be optional, is an identifier of a category of a QualityIssueCategoryCatalogue of type Defect Location. CauseQualityIssueCategoryCatalogueID, which can be optional, is an identifier of a QualityIssueCategoryCatalogue of type Cause. CauseParentQualityIssueCategoryID, which can be optional, is an identifier of a parent category of a QualityIssueCategoryCatalogue of type Cause. CauseQualityIssueCategoryID, which can be optional, is an identifier of a category of a QualityIssueCategoryCatalogue of type Cause. DefectNumberValue is a number of defects occurred in the examined subset. AffectedQuantity is the quantity of the material affected by the finding in the examined subset. Description is a short description of the finding. DefectClassCode, which can be optional, is a coded representation of a defect class that shows the qualitative effect of the defect, for example, the consequences of defects. DefectWeightingClassCode, which can be optional, is a coded representation of a weighting of the defect with regard to the manufacture of the material, for example, relating to the required inspection effort or the follow-up effort due to defects in construction or production. SystematicIndicator, which can be optional, indicates whether the finding occurs systematically. A systematically occurring finding is one that can be traced back to a cause that is constant and stays the same.

Message Data Type

The message data type MaterialInspectionSubsetOperationInspectionActivityFindingCreateConfirmationMessage_sync contains the business information that is relevant for sending a business document in a message, the MaterialInspection included in the business document, and the Log. The MaterialInspection package groups the MaterialInspection with its packages. FIGS. 367-1 through 367-3 show a MaterialInspectionSubsetOperationInspectionActivityFindingCreateConfirmationMessage 367000 package. The MaterialInspectionSubsetOperationInspectionActivityFinding CreateConfirmationMessage 367000 package is a MaterialInspectionSubsetOperationInspectionActivityFindingCreateConfirmationMessage_sync 367004 datatype. The MaterialInspectionSubsetOperationInspectionActivityFindingCreateConfirmationMessage 367000 package includes a MaterialInspectionSubsetOperationInspectionActivityFindingCreateConfirmationMessage_sync 367002 entity. The MaterialInspectionSubsetOperationInspectionActivityFindingCreateConfirmationMessage 367000 package includes various packages, namely MessageHeader 367006, MaterialInspection 367014 and Log 367080.

The MessageHeader 367006 package is a BasicBusinessDocumentMessageHeader 367012 datatype. The MessageHeader 367006 package includes a MessageHeader 367008 entity.

The MessageHeader 367008 entity has a cardinality of zero or one 367010 meaning that for each instance of the MaterialInspectionSubsetOperationInspectionActivityFindingCreateConfirmationMessage_sync 367002 entity there may be one MessageHeader 367008 entity.

The MaterialInspection 367014 package includes a MaterialInspection 367016 entity. The MaterialInspection 367014 package includes a Subset 367026 package.

The MaterialInspection 367016 entity has a cardinality of zero or one 367018 meaning that for each instance of the MaterialInspectionSubsetOperationInspectionActivityFindingCreateConfirmationMessage_sync 367002 entity there may be one MaterialInspection 367016 entity. The MaterialInspection 367016 entity includes an ID 367020 attribute.

The ID 367020 attribute is a MaterialInspectionID 367024 datatype. The ID 367020 attribute has a cardinality of one 367022 meaning that for each instance of the MaterialInspection 367016 entity there is one ID 367020 attribute.

The Subset 367026 package includes a Subset 367028 entity. The Subset 367026 package includes an Operation 367038 package.

The Subset 367028 entity has a cardinality of one 367030 meaning that for each instance of the MaterialInspection 367016 entity there is one Subset 367028 entity. The Sub-set 367028 entity includes an ID 367032 attribute.

The ID 367032 attribute is an InspectionSubsetID 367036 datatype. The ID 367032 attribute has a cardinality of one 367034 meaning that for each instance of the Subset 367028 entity there is one ID 367032 attribute.

The Operation 367038 package includes an Operation 367040 entity. The Operation 367038 package includes an InspectionActivity 367050 package.

The Operation 367040 entity has a cardinality of one 367042 meaning that for each instance of the Subset 367028 entity there is one Operation 367040 entity. The Operation 367040 entity includes an ID 367044 attribute.

The ID 367044 attribute is a MaterialInspectionSubset-OperationID 367048 datatype. The ID 367044 attribute has a cardinality of one 367046 meaning that for each instance of the Operation 367040 entity there is one ID 367044 attribute.

The InspectionActivity 367050 package includes an InspectionActivity 367052 entity.

The InspectionActivity 367052 entity has a cardinality of one 367054 meaning that for each instance of the Operation 367040 entity there is one InspectionActivity 367052 entity. The InspectionActivity 367052 entity includes various attributes, namely ID 367056, LifeCycleStatusCode 367062, LifeCycleStatusName 367068 and FindingReportedIndicator 367074.

The ID 367056 attribute is a MaterialnspectionSubsetOperationInspectionActivityID 367060 datatype. The ID 367056 attribute has a cardinality of one 367058 meaning that for each instance of the InspectionActivity 367052 entity there is one ID 367056 attribute.

The LifeCycleStatusCode 367062 attribute is an InspectionActivityLifeCycleStatusCode 367066 datatype. The LifeCycleStatusCode 367062 attribute has a cardinality of one 367064 meaning that for each instance of the Inspection-Activity 367052 entity there is one LifeCycleStatusCode 367062 attribute.

The LifeCycleStatusName 367068 attribute is a MEDIUM_Name 367072 datatype. The LifeCycleStatus-Name 367068 attribute has a cardinality of zero or one 367070 meaning that for each instance of the InspectionActivity 367052 entity there may be one LifeCycleStatusName 367068 attribute.

The FindingReportedIndicator 367074 attribute is an Indicator 367078 datatype. The FindingReportedIndicator 367074 attribute has a cardinality of one 367076 meaning that for each instance of the InspectionActivity 367052 entity there is one FindingReportedIndicator 367074 attribute.

The Log 367080 package is a Log 367086 datatype. The Log 367080 package includes a Log 367082 entity.

The Log 367082 entity has a cardinality of one 367084 meaning that for each instance of the MaterialInspectionSubsetOperationInspectionActivityFindingCreateConfirmationMessage_sync 367002 entity there is one Log 367082 entity.

MaterialInspection

MaterialInspection is a document that describes the execution of an inspection for a particular material, and that is used to record this inspection.

Material Inspection

ID is a unique identifier for a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation.

InspectionActivity Package

The InspectionActivity package groups information of the MaterialInspectionSubsetOperationInspectionActivity. InspectionActivity is a detailed work instruction how an inspection has to be performed. ID is an identifier of an inspection activity. LifeCycleStatusCode is a coded representation of the current step in the life cycle of an inspection activity. LifeCycleStatusName, which can be optional, is a name of the current step in the life cycle of an inspection activity. FindingReportedIndicator is an indicator that shows that a finding is reported.

Message Data Type

The message data type MaterialInspectionSubsetOperationInspectionActivityCreateRequestMessage_sync contains the business information that is relevant for sending a business document in a message and the MaterialInspection included in the business document.

FIGS. 366-1 through 366-4 show a MaterialInspection-SubsetOperationInspectionActivityCreateRequestMessage 366000 package. The MaterialInspectionSubsetOperationInspectionActivityCreateRequestMessage 366000 package is a MaterialInspectionSubsetOperationInspectionActivityCreateRequestMessage_sync 366004 datatype. The MaterialInspectionSubsetOperationInspectionActivityCreateRequestMessage 366000 package includes a MaterialInspectionSubsetOperationInspectionActivityCreateRequestMessage_sync 366002 entity. The MaterialInspectionSubsetOperationInspectionActivityCreateRequestMessage 366000 package includes various packages, namely MessageHeader 366006 and MaterialInspection 366014.

The MessageHeader 366006 package is a BasicBusiness-DocumentMessageHeader 366012 datatype. The Message-Header 366006 package includes a MessageHeader 366008 entity.

The MessageHeader 366008 entity has a cardinality of zero or one 366010 meaning that for each instance of the MaterialInspectionSubsetOperationInspectionActivityCreateRequestMessage_sync 366002 entity there may be one MessageHeader 366008 entity.

The MaterialInspection 366014 package includes a MaterialInspection 366016 entity. The MaterialInspection 366014 package includes a Subset 366026 package.

The MaterialInspection 366016 entity has a cardinality of one 366018 meaning that for each instance of the MaterialInspectionSubsetOperationInspectionActivityCreateRequestMessage_sync 366002 entity there is one MaterialInspection 366016 entity. The MaterialInspection 366016 entity includes an ID 366020 attribute.

The ID 366020 attribute is a MaterialInspectionID 366024 datatype. The ID 366020 attribute has a cardinality of one 366022 meaning that for each instance of the MaterialInspection 366016 entity there is one ID 366020 attribute.

The Subset 366026 package includes a Subset 366028 entity. The Subset 366026 package includes an Operation 366038 package.

The Subset 366028 entity has a cardinality of one 366030 meaning that for each instance of the MaterialInspection 366016 entity there is one Subset 366028 entity. The Sub-set 366028 entity includes an ID 366032 attribute.

The ID 366032 attribute is an InspectionSubsetID 366036 datatype. The ID 366032 attribute has a cardinality of one 366034 meaning that for each instance of the Subset 366028 entity there is one ID 366032 attribute.

The Operation 366038 package includes an Operation 366040 entity. The Operation 366038 package includes an InspectionActivity 366050 package.

The Operation 366040 entity has a cardinality of one 366042 meaning that for each instance of the Subset 366028 entity there is one Operation 366040 entity. The Operation 366040 entity includes an ID 366044 attribute.

The ID 366044 attribute is a MaterialInspectionSubsetOperationID 366048 datatype. The ID 366044 attribute has a cardinality of one 366046 meaning that for each instance of the Operation 366040 entity there is one ID 366044 attribute.

The InspectionActivity 366050 package includes an InspectionActivity 366052 entity.

The InspectionActivity 366052 entity has a cardinality of one 366054 meaning that for each instance of the Operation 366040 entity there is one InspectionActivity 366052 entity. The InspectionActivity 366052 entity includes various attributes, namely InspectionSpecificationID 366056, InspectionSpecificationPlantID 366062, InspectionSpecificationVersionID 366068, Description 366074, InspectionSampleSizeDeterminationAndValuationRuleID 366080 and SampleSizeQuantity 366086.

The InspectionSpecificationID 366056 attribute is an InspectionSpecificationID 366060 datatype. The InspectionSpecificationID 366056 attribute has a cardinality of one 366058 meaning that for each instance of the InspectionActivity 366052 entity there is one InspectionSpecificationID 366056 attribute.

The InspectionSpecificationPlantID 366062 attribute is a PlantID 366066 datatype. The InspectionSpecificationPlantID 366062 attribute has a cardinality of one 366064 meaning that for each instance of the InspectionActivity 366052 entity there is one InspectionSpecificationPlantID 366062 attribute.

The InspectionSpecificationVersionID 366068 attribute is a VersionID 366072 datatype. The InspectionSpecificationVersionID 366068 attribute has a cardinality of one 366070 meaning that for each instance of the InspectionActivity 366052 entity there is one InspectionSpecificationVersionID 366068 attribute.

The Description 366074 attribute is a SHORT_Description 366078 datatype. The Description 366074 attribute has a cardinality of zero or one 366076 meaning that for each instance of the InspectionActivity 366052 entity there may be one Description 366074 attribute.

The InspectionSampleSizeDeterminationAndValuationRuleID 366080 attribute is an InspectionSampleSizeDeterminationAndValuationRuleID 366084 datatype. The InspectionSampleSizeDeterminationAndValuationRuleID 366080 attribute has a cardinality of one 366082 meaning that for each instance of the InspectionActivity 366052 entity there is one InspectionSampleSizeDeterminationAndValuationRuleID 366080 attribute.

The SampleSizeQuantity 366086 attribute is a Quantity 366090 datatype. The SampleSizeQuantity 366086 attribute has a cardinality of one 366088 meaning that for each instance of the InspectionActivity 366052 entity there is one SampleSizeQuantity 366086 attribute.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation.

InspectionActivity Package

The InspectionActivity package groups information of the MaterialInspectionSubsetOperationInspectionActivity. InspectionActivity is a detailed work instruction how an inspection has to be performed. InspectionSpecificationID is a unique identifier of the inspection specification. InspectionSpecificationPlantID is a unique identifier of the plant of the inspection specification. InspectionSpecificationVersionID is a unique identifier of the version of the inspection specification. Description is a description of the inspection activity.

InspectionSampleSizeDeterminationAndValuationRuleID is an identifier for a rule that determines and valuates the sample size for an inspection. The inspection sample size determination and valuation rule is used in the context of an inspection and provides information about how the sample size is determined (fixed sample size, percentage of Lot size quantity, or using a sampling scheme) and later on valuated.

SampleSizeQuantity is a sample size for a sampling inspection. The sample size describes how many units are to be taken from a quantity of discrete units of the material to be inspected. The sample size is either determined using a sample size determination rule or it is fixed.

Message Data Type

The message data type MaterialInspectionSubsetOperationInspectionActivityCreateConfirmationMessage_sync contains The business information that is relevant for sending a business document in a message, the MaterialInspection included in the business document, and the Log. The MaterialInspection package groups the MaterialInspection with its packages.

FIGS. 365-1 through 365-2 show a MaterialInspectionSubsetOperationInspectionActivityCreateConfirmatioMessage 365000 package. The MaterialInspectionSubsetOperationInspectionActivityCreateConfirmationMessage 365000 package is a MaterialInspectionSubsetOperationInspectionActivityCreateConfirmationMessage_sync 365004 datatype. The MaterialInspectionSubsetOperationInspectionActivityCreateConfirmationMessage 365000 package includes a MaterialInspectionSubsetOperationInspectionActivityCreateConfirmationMessage_sync 365002 entity. The MaterialInspectionSubsetOperationInspectionActivityCreateConfirmationMessage 365000 package includes various packages, namely MessageHeader 365006, MaterialInspection 365014 and Log 365062.

The MessageHeader 365006 package is a BasicBusinessDocumentMessageHeader 365012 datatype. The MessageHeader 365006 package includes a MessageHeader 365008 entity.

The MessageHeader 365008 entity has a cardinality of zero or one 365010 meaning that for each instance of the MaterialInspectionSubsetOperationInspectionActivityCreateConfirmationMessage_sync 365002 entity there may be one MessageHeader 365008 entity. The MaterialInspection 365014 package includes a MaterialInspection 365016 entity. The MaterialInspection 365014 package includes a Subset 365026 package.

The MaterialInspection 365016 entity has a cardinality of zero or one 365018 meaning that for each instance of the MaterialInspectionSubsetOperationInspectionActivityCreateConfirmationMessage_sync 365002 entity there may be one MaterialInspection 365016 entity. The MaterialInspection 365016 entity includes an ID 365020 attribute.

The ID 365020 attribute is a MaterialInspectionID 365024 datatype. The ID 365020 attribute has a cardinality of one 365022 meaning that for each instance of the MaterialInspection 365016 entity there is one ID 365020 attribute.

The Subset 365026 package includes a Subset 365028 entity. The Subset 365026 package includes an Operation 365038 package.

The Subset 365028 entity has a cardinality of one 365030 meaning that for each instance of the MaterialInspection 365016 entity there is one Subset 365028 entity. The Sub-set 365028 entity includes an ID 365032 attribute.

The ID 365032 attribute is an InspectionSubsetID 365036 datatype. The ID 365032 attribute has a cardinality of one 365034 meaning that for each instance of the Subset 365028 entity there is one ID 365032 attribute.

The Operation 365038 package includes an Operation 365040 entity. The Operation 365038 package includes an InspectionActivity 365050 package.

The Operation 365040 entity has a cardinality of one 365042 meaning that for each instance of the Subset 365028 entity there is one Operation 365040 entity. The Operation 365040 entity includes an ID 365044 attribute.

The ID 365044 attribute is a MaterialInspectionSubsetOperationID 365048 datatype. The ID 365044 attribute has a cardinality of one 365046 meaning that for each instance of the Operation 365040 entity there is one ID 365044 attribute.

The InspectionActivity 365050 package includes an InspectionActivity 365052 entity.

The InspectionActivity 365052 entity has a cardinality of one 365054 meaning that for each instance of the Operation 365040 entity there is one InspectionActivity 365052 entity. The InspectionActivity 365052 entity includes an ID 365056 attribute.

The ID 365056 attribute is a MaterialInspectionSubsetOperationInspectionActivityID 365060 datatype. The ID 365056 attribute has a cardinality of one 365058 meaning that for each instance of the InspectionActivity 365052 entity there is one ID 365056 attribute.

The Log 365062 package is a Log 365068 datatype. The Log 365062 package includes a Log 365064 entity.

The Log 365064 entity has a cardinality of one 365066 meaning that for each instance of the MaterialInspectionSubsetOperationInspectionActivityCreateConfirmationMessage_sync 365002 entity there is one Log 365064 entity.

MaterialInspection

MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Operation Package

The Operation package groups the MaterialInspectionSubsetOperation with its packages. Operation is the activity associated with an inspection of one or more inspection specifications with specific technical assets at a specific work center. ID is an identifier of a material inspection operation.

InspectionActivity Package

The InspectionActivity package groups information of the MaterialInspectionSubsetOperationInspectionActivity. InspectionActivity is a detailed work instruction that indicates how an inspection is performed. ID is an identifier of an inspection activity.

Message Data Type

The message data type MaterialInspectionSubsetCreateRequestMessage_sync contains the business information that is relevant for sending a business document in a message and the MaterialInspection included in the business document.

FIGS. 356-1 through 356-3 show a MaterialInspectionSubsetCreateRequestMessage 356000 package. The MaterialInspectionSubsetCreateRequestMessage 356000 package is a MaterialInspectionSubsetCreateRequestMessage_sync 356004 datatype. The MaterialInspectionSubsetCreateRequestMessage 356000 package includes a MaterialInspectionSubsetCreateRequestMessage_sync 356002 entity. The MaterialInspectionSubsetCreateRequestMessage 356000 package includes various packages, namely MessageHeader 356006 and MaterialInspection 356014.

The MessageHeader 356006 package is a BasicBusinessDocumentMessageHeader 356012 datatype. The MessageHeader 356006 package includes a MessageHeader 356008 entity.

The MessageHeader 356008 entity has a cardinality of zero or one 356010 meaning that for each instance of the MaterialInspectionSubsetCreateRequestMessage_sync 356002 entity there may be one MessageHeader 356008 entity.

The MaterialInspection 356014 package includes a MaterialInspection 356016 entity. The MaterialInspection 356014 package includes a Subset 356026 package.

The MaterialInspection 356016 entity has a cardinality of one 356018 meaning that for each instance of the MaterialInspectionSubsetCreateRequestMessage_sync 356002 entity there is one MaterialInspection 356016 entity. The MaterialInspection 356016 entity includes an ID 356020 attribute.

The ID 356020 attribute is a MaterialInspectionID 356024 datatype. The ID 356020 attribute has a cardinality of one 356022 meaning that for each instance of the MaterialInspection 356016 entity there is one ID 356020 attribute.

The Subset 356026 package includes a Subset 356028 entity. The Subset 356026 package includes an Operation 356056 package.

The Subset 356028 entity has a cardinality of one 356030 meaning that for each instance of the MaterialInspection 356016 entity there is one Subset 356028 entity. The Sub-set 356028 entity includes various attributes, namely MediumSignificantDescription 356032, ShortSignificantDescription 356038, MediumSignificantCounterValue 356044 and ShortSignificantCounterValue 356050.

The MediumSignificantDescription 356032 attribute is a LANGUAGEINDEPENDENT_SHORT_Description 356036 datatype. The MediumSignificantDescription 356032 attribute has a cardinality of zero or one 356034 meaning that for each instance of the Subset 356028 entity there may be one MediumSignificantDescription 356032 attribute.

The ShortSignificantDescription 356038 attribute is a LANGUAGEINDEPENDENT_SHORT_Description 356042 datatype. The ShortSignificantDescription 356038 attribute has a cardinality of zero or one 356040 meaning that for each instance of the Subset 356028 entity there may be one ShortSignificantDescription 356038 attribute.

The MediumSignificantCounterValue 356044 attribute is a Value 356048 datatype. The MediumSignificantCounterValue 356044 attribute has a cardinality of zero or one 356046 meaning that for each instance of the Subset 356028 entity there may be one MediumSignificantCounterValue 356044 attribute.

The ShortSignificantCounterValue 356050 attribute is a Value 356054 datatype. The ShortSignificantCounterValue 356050 attribute has a cardinality of zero or one 356052 meaning that for each instance of the Subset 356028 entity there may be one ShortSignificantCounterValue 356050 attribute.

The Operation 356056 package includes an Operation 356058 entity.

The Operation 356058 entity has a cardinality of one 356060 meaning that for each instance of the Subset 356028 entity there is one Operation 356058 entity. The Operation 356058 entity includes an ID 356062 attribute.

The ID 356062 attribute is a MaterialInspectionSubsetOperationID 356066 datatype. The ID 356062 attribute has a cardinality of one 356064 meaning that for each instance of the Operation 356058 entity there is one ID 356062 attribute.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some special cases it may also be the total quantity. MediumSignificantDescription, which can be optional, is a first language independent significant description for a subset. In some implementations, length is restricted to 18 characters. ShortSignificantDescription, which can be optional, is a second language independent significant description for a subset. In some implementations, length is restricted to 10 characters. MediumSignificantCounterValue, which can be optional, is a first significant counter value for a subset. In some implementations, length is restricted to 10 digits. ShortSignificantCounterValue, which can be optional, is a second significant counter value for a subset. In some implementations, length is restricted to 3 digits. The element to be provided is depending on subset configuration.

Operation Package

The Operation package groups information of the MaterialInspectionSubsetOperation. Operation is an activity associated with an inspection of one or more inspection specifications with specific technical assets at a specific work center. ID is an identifier of a material inspection operation.

Message Data Type

The message data type MaterialInspectionSubsetCreateConfirmationMessage_sync contains the business information that is relevant for sending a business document in a message, the MaterialInspection included in the business document, and the Log.

FIG. 355 shows a MaterialInspectionSubsetCreateConfirmationMessage 355000 package. The MaterialInspectionSubsetCreateConfirmationMessage 355000 package is a MaterialInspectionSubsetCreateConfirmationMessage_sync 355004 datatype. The MaterialInspectionSubsetCreateConfirmationMessage 355000 package includes a MaterialInspectionSubsetCreateConfirmationMessage_sync 355002 entity. The MaterialInspectionSubsetCreateConfirmationMessage 355000 package includes various packages, namely MessageHeader 355006, MaterialInspection 355014 and Log 355038.

The MessageHeader 355006 package is a BasicBusinessDocumentMessageHeader 355012 datatype. The MessageHeader 355006 package includes a MessageHeader 355008 entity.

The MessageHeader 355008 entity has a cardinality of zero or one 355010 meaning that for each instance of the MaterialInspectionSubsetCreateConfirmationMessage_sync 355002 entity there may be one MessageHeader 355008 entity.

The MaterialInspection 355014 package includes a MaterialInspection 355016 entity. The MaterialInspection 355014 package includes a Subset 355026 package.

The MaterialInspection 355016 entity has a cardinality of zero or one 355018 meaning that for each instance of the MaterialInspectionSubsetCreateConfirmationMessage_sync 355002 entity there may be one MaterialInspection 355016 entity. The MaterialInspection 355016 entity includes an ID 355020 attribute.

The ID 355020 attribute is a MaterialInspectionID 355024 datatype. The ID 355020 attribute has a cardinality of one 355022 meaning that for each instance of the MaterialInspection 355016 entity there is one ID 355020 attribute.

The Subset 355026 package includes a Subset 355028 entity.

The Subset 355028 entity has a cardinality of one 355030 meaning that for each instance of the MaterialInspection 355016 entity there is one Subset 355028 entity. The Sub-set 355028 entity includes an ID 355032 attribute.

The ID 355032 attribute is an InspectionSubsetID 355036 datatype. The ID 355032 attribute has a cardinality of one 355034 meaning that for each instance of the Subset 355028 entity there is one ID 355032 attribute.

The Log 355038 package is a Log 355044 datatype. The Log 355038 package includes a Log 355040 entity.

The Log 355040 entity has a cardinality of one 355042 meaning that for each instance of the MaterialInspectionSubsetCreateConfirmationMessage_sync 355002 entity there is one Log 355040 entity.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection.

Subset Package

The Subset package groups information of the MaterialInspectionSubset.

Subset

Subset is a partial quantity of the total quantity to be inspected. In some special cases it may also be the total quantity. ID is a unique identifier of a subset.

Message Data Type

The message data type MaterialInspectionSubsetDecisionCreateRequestMessage_sync contains the business information that is relevant for sending a business document in a message and the MaterialInspection included in the business document.

FIGS. 358-1 through 358-2 show a MaterialInspectionSubsetDecisionCreateRequestMessage 358000 package. The MaterialInspectionSubsetDecisionCreateRequestMessage 358000 package is a MaterialInspectionSubsetDecisionCreateRequestMessage_sync 358004 datatype. The MaterialInspectionSubsetDecisionCreateRequestMessage 358000 package includes a MaterialInspectionSubsetDecisionCreateRequestMessage_sync 358002 entity. The MaterialInspectionSubsetDecisionCreateRequestMessage 358000 package includes various packages, namely MessageHeader 358006 and MaterialInspection 358014.

The MessageHeader 358006 package is a BasicBusinessDocumentMessageHeader 358012 datatype. The MessageHeader 358006 package includes a MessageHeader 358008 entity.

The MessageHeader 358008 entity has a cardinality of zero or one 358010 meaning that for each instance of the MaterialInspectionSubsetDecisionCreateRequestMessage_sync 358002 entity there may be one MessageHeader 358008 entity.

The MaterialInspection 358014 package includes a MaterialInspection 358016 entity. The MaterialInspection 358014 package includes a Subset 358026 package.

The MaterialInspection 358016 entity has a cardinality of one 358018 meaning that for each instance of the MaterialInspectionSubsetDecisionCreateRequestMessage_sync 358002 entity there is one MaterialInspection 358016 entity. The MaterialInspection 358016 entity includes an ID 358020 attribute.

The ID 358020 attribute is a MaterialInspectionID 358024 datatype. The ID 358020 attribute has a cardinality of one 358022 meaning that for each instance of the MaterialInspection 358016 entity there is one ID 358020 attribute.

The Subset 358026 package includes a Subset 358028 entity. The Subset 358026 package includes a Decision 358038 package.

The Subset 358028 entity has a cardinality of one 358030 meaning that for each instance of the MaterialInspection 358016 entity there is one Subset 358028 entity. The Sub-set 358028 entity includes an ID 358032 attribute.

The ID 358032 attribute is an InspectionSubsetID 358036 datatype. The ID 358032 attribute has a cardinality of one 358034 meaning that for each instance of the Subset 358028 entity there is one ID 358032 attribute.

The Decision 358038 package includes a Decision 358040 entity.

The Decision 358040 entity has a cardinality of one 358042 meaning that for each instance of the Subset 358028 entity there is one Decision 358040 entity. The Decision 358040 entity includes various attributes, namely ParentQualityIssueCategoryID 358044 and QualityIssueCategoryID 358050.

The ParentQualityIssueCategoryID 358044 attribute is a QualityIssueCategoryID 358048 datatype. The ParentQualityIssueCategoryID 358044 attribute has a cardinality of one 358046 meaning that for each instance of the Decision 358040 entity there is one ParentQualityIssueCategoryID 358044 attribute.

The QualityIssueCategoryID 358050 attribute is a QualityIssueCategoryID 358054 datatype. The QualityIssueCategoryID 358050 attribute has a cardinality of one 358052 meaning that for each instance of the Decision 358040 entity there is one QualityIssueCategoryID 358050 attribute.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some special cases it may also be the total quantity. ID is a unique identifier of a subset.

Decision Package

The Decision package groups information of the decision of a MaterialInspectionSubsetDecision.

Decision

Decision is a decision about the further use of a subset of the inspected material in the business process. The main purpose of the decision is the rejection or acceptance of the subset of the inspected material. ParentQualityIssueCategoryID is an identifier of a parent category of a QualityIssueCategoryCatalogue of type Decision. QualityIssueCategoryID is an identifier of a category of a QualityIssueCategoryCatalogue of type Decision. The decision depends on the valuation (rejected or accepted) of the QualityIssueCategoryID.

Message Data Type

The message data type MaterialInspectionSubsetDecisionCreateConfirmationMessage_sync contains the business information that is relevant for sending a business document in a message, the MaterialInspection included in the business document, and the Log.

FIGS. 357-1 through 357-3 show a MaterialInspectionSubsetDecisionCreateConfirmationMessage 357000 package. The MaterialInspectionSubsetDecisionCreateConfirmationMessage 357000 package is a MaterialInspectionSubsetDecisionCreateConfirmationMessage_sync 357004 datatype. The MaterialInspectionSubsetDecisionCreateConfirmationMessage 357000 package includes a MaterialInspectionSubsetDecisionCreateConfirmationMessage_sync 357002 entity. The MaterialInspectionSubsetDecisionCreateConfirmationMessage 357000 package includes various packages, namely MessageHeader 357006, MaterialInspection 357014 and Log 357074.

The MessageHeader 357006 package is a BasicBusinessDocumentMessageHeader 357012 datatype. The MessageHeader 357006 package includes a MessageHeader 357008 entity.

The MessageHeader 357008 entity has a cardinality of zero or one 357010 meaning that for each instance of the MaterialInspectionSubsetDecisionCreateConfirmationMessage_sync 357002 entity there may be one MessageHeader 357008 entity.

The MaterialInspection 357014 package includes a MaterialInspection 357016 entity. The MaterialInspection 357014 package includes a Subset 357026 package.

The MaterialInspection 357016 entity has a cardinality of zero or one 357018 meaning that for each instance of the MaterialInspectionSubsetDecisionCreateConfirmationMessage_sync 357002 entity there may be one MaterialInspection 357016 entity. The MaterialInspection 357016 entity includes an ID 357020 attribute.

The ID 357020 attribute is a MaterialInspectionID 357024 datatype. The ID 357020 attribute has a cardinality of one 357022 meaning that for each instance of the MaterialInspection 357016 entity there is one ID 357020 attribute.

The Subset 357026 package includes a Subset 357028 entity. The Subset 357026 package includes a Decision 357038 package.

The Subset 357028 entity has a cardinality of zero or one 357030 meaning that for each instance of the MaterialInspection 357016 entity there may be one Subset 357028 entity. The Subset 357028 entity includes an ID 357032 attribute.

The ID 357032 attribute is an InspectionSubsetID 357036 datatype. The ID 357032 attribute has a cardinality of one 357034 meaning that for each instance of the Subset 357028 entity there is one ID 357032 attribute.

The Decision 357038 package includes a Decision 357040 entity.

The Decision 357040 entity has a cardinality of one 357042 meaning that for each instance of the Subset 357028 entity there is one Decision 357040 entity. The Decision 357040 entity includes various attributes, namely ParentQualityIssueCategoryID 357044, ParentQualityIssueCategoryName 357050, QualityIssueCategoryID 357056, QualityIssueCategoryName 357062 and AcceptanceStatusCode 357068.

The ParentQualityIssueCategoryID 357044 attribute is a QualityIssueCategoryID 357048 datatype. The ParentQualityIssueCategoryID 357044 attribute has a cardinality of one 357046 meaning that for each instance of the Decision 357040 entity there is one ParentQualityIssueCategoryID 357044 attribute.

The ParentQualityIssueCategoryName 357050 attribute is a MEDIUM_Name 357054 datatype. The ParentQualityIssueCategoryName 357050 attribute has a cardinality of zero or one 357052 meaning that for each instance of the Decision 357040 entity there may be one ParentQualityIssueCategoryName 357050 attribute.

The QualityIssueCategoryID 357056 attribute is a QualityIssueCategoryID 357060 datatype. The QualityIssueCategoryID 357056 attribute has a cardinality of one 357058 meaning that for each instance of the Decision 357040 entity there is one QualityIssueCategoryID 357056 attribute.

The QualityIssueCategoryName 357062 attribute is a MEDIUM_Name 357066 datatype. The QualityIssueCategoryName 357062 attribute has a cardinality of zero or one 357064 meaning that for each instance of the Decision 357040 entity there may be one QualityIssueCategoryName 357062 attribute.

The AcceptanceStatusCode 357068 attribute is an AcceptanceStatusCode 357072 datatype. The AcceptanceStatusCode 357068 attribute has a cardinality of one 357070 meaning that for each instance of the Decision 357040 entity there is one AcceptanceStatusCode 357068 attribute.

The Log 357074 package is a Log 357080 datatype. The Log 357074 package includes a Log 357076 entity.

The Log 357076 entity has a cardinality of one 357078 meaning that for each instance of the MaterialInspectionSubsetDecisionCreateConfirmationMessage_sync 357002 entity there is one Log 357076 entity.

MaterialInspection Package

The MaterialInspection package groups the MaterialInspection with its packages.

MaterialInspection

A MaterialInspection is a document that describes the execution of an inspection for a particular material, and that is used to record this inspection. ID is a unique identifier for a material inspection.

Subset Package

The Subset package groups the MaterialInspectionSubset with its packages.

Subset

Subset is a partial quantity of the total quantity to be inspected. In some cases, it may also be the total quantity. ID is a unique identifier of a subset.

Decision Package

The Decision package groups information of the decision of a MaterialInspectionSubset.

Decision

Decision is a decision about the further use of a subset of the inspected material in the business process. The main purpose of the decision is the rejection or acceptance of the subset of the inspected material. ParentQualityIssueCategoryID is an identifier of a parent category of a QualityIssueCategoryCatalogue of type Decision. ParentQualityIssueCategoryName, which can be optional, is of a QualityIssueCategoryCatalogue of type Decision. QualityIssueCategoryID is an identifier of a category of a QualityIssueCategoryCatalogue of type Decision. QualityIssueCategoryName, which can be optional, is a name of the category of a QualityIssueCategoryCatalogue of type Decision. AcceptanceStatusCode is a valuation of the subset with respect to its acceptance or rejection in the continued business process.

Message Data Type

The message data type MaterialInspectionDecisionCreateRequestMessage_sync contains the business information that is relevant for sending a business document in a message and the MaterialInspection included in the business document.

FIGS. 354-1 through 354-2 show a MaterialInspectionDecisionCreateRequestMessage 354000 package. The MaterialInspectionDecisionCreateRequestMessage 354000 package is a MaterialInspectionDecisionCreateRequestMessage_sync 354004 datatype. The MaterialInspectionDecisionCreateRequestMessage 354000 package includes a MaterialInspectionDecisionCreateRequestMessage_sync 354002 entity. The MaterialInspectionDecisionCreateRequestMessage 354000 package includes various packages, namely MessageHeader 354006 and MaterialInspection 354014.

The MessageHeader 354006 package is a BasicBusinessDocumentMessageHeader 354012 datatype. The MessageHeader 354006 package includes a MessageHeader 354008 entity.

The MessageHeader 354008 entity has a cardinality of zero or one 354010 meaning that for each instance of the MaterialInspectionDecisionCreateRequestMessage_sync 354002 entity there may be one MessageHeader 354008 entity.

The MaterialInspection 354014 package includes a MaterialInspection 354016 entity. The MaterialInspection 354014 package includes a Decision 354026 package.

The MaterialInspection 354016 entity has a cardinality of one 354018 meaning that for each instance of the MaterialInspectionDecisionCreateRequestMessage_sync 354002 entity there is one MaterialInspection 354016 entity. The MaterialInspection 354016 entity includes an ID 354020 attribute.

The ID 354020 attribute is a MaterialInspectionID 354024 datatype. The ID 354020 attribute has a cardinality of one 354022 meaning that for each instance of the MaterialInspection 354016 entity there is one ID 354020 attribute.

The Decision 354026 package includes a Decision 354028 entity.

The Decision 354028 entity has a cardinality of one 354030 meaning that for each instance of the MaterialInspection 354016 entity there is one Decision 354028 entity. The Decision 354028 entity includes various attributes, namely ParentQualityIssueCategoryID 354032, QualityIssueCategoryID 354038, QualityScoreOrdinalNumberValue 354044, DetailedText 354050 and BatchExpirationDate 354056.

The ParentQualityIssueCategoryID 354032 attribute is a QualityIssueCategoryID 354036 datatype. The ParentQualityIssueCategoryID 354032 attribute has a cardinality of one 354034 meaning that for each instance of the Decision 354028 entity there is one ParentQualityIssueCategoryID 354032 attribute.

The QualityIssueCategoryID 354038 attribute is a QualityIssueCategoryID 354042 datatype. The QualityIssueCategoryID 354038 attribute has a cardinality of one 354040 meaning that for each instance of the Decision 354028 entity there is one QualityIssueCategoryID 354038 attribute.

The QualityScoreOrdinalNumberValue 354044 attribute is a QualityIssueCategoryID 354048 datatype. The QualityScoreOrdinalNumberValue 354044 attribute has a cardinality of zero or one 354046 meaning that for each instance of the Decision 354028 entity there may be one QualityScoreOrdinalNumberValue 354044 attribute.

The DetailedText 354050 attribute is a Text 354054 datatype. The DetailedText 354050 attribute has a cardinality of zero or one 354052 meaning that for each instance of the Decision 354028 entity there may be one DetailedText 354050 attribute.

The BatchExpirationDate 354056 attribute is a Date 354060 datatype. The BatchExpirationDate 354056 attribute has a cardinality of zero or one 354058 meaning that for each instance of the Decision 354028 entity there may be one BatchExpirationDate 354056 attribute.

MaterialInspection Package

The MaterialInspection package groups the MaterialInspection with its packages.

MaterialInspection

MaterialInspection is a document that describes the execution of an inspection for a particular material, and that is used to record this inspection. ID is a unique identifier for a material inspection.

Decision Package

The Decision package groups information of the decision of a MaterialInspection.

Decision

Decision is a decision about the further use of the inspected material in the business process. The main purpose of the decision is the rejection or acceptance of the total quantity. ParentQualityIssueCategoryID is an identifier of a parent category of a QualityIssueCategoryCatalogue of type Decision. QualityIssueCategoryID is an identifier of a category of a QualityIssueCategoryCatalogue of type Decision. The decision depends on the valuation (rejected or accepted) of the QualityIssueCategoryID. QualityScoreOrdinalNumberValue is a value of the quality score used to evaluate the quality of the inspected total quantity. DetailedText, which can be optional, can describe a decision. BatchExpirationDate, which can be optional, is a date at which the batch of the inspected material expires.

Message Data Type

The message data type MaterialInspectionDecisionCreateConfirmationMessage_sync contains the business information that is relevant for sending a business document in a message and the MaterialInspection included in the business document.

FIGS. 353-1 through 353-3 show a MaterialInspectionDecisionCreateConfirmationMessage 353000 package. The MaterialInspectionDecisionCreateConfirmationMessage 353000 package is a MaterialInspectionDecisionCreateConfirmationMessage_sync 353004 datatype. The MaterialInspectionDecisionCreateConfirmationMessage 353000 package includes a MaterialInspectionDecisionCreateConfirmationMessage_sync 353002 entity. The MaterialInspectionDecisionCreateConfirmationMessage 353000 package includes various packages, namely MessageHeader 353006, MaterialInspection 353014 and Log 353080.

The MessageHeader 353006 package is a BasicBusinessDocumentMessageHeader 353012 datatype. The MessageHeader 353006 package includes a MessageHeader 353008 entity.

The MessageHeader 353008 entity has a cardinality of zero or one 353010 meaning that for each instance of the MaterialInspectionDecisionCreateConfirmationMessage_sync 353002 entity there may be one MessageHeader 353008 entity.

The MaterialInspection 353014 package includes a MaterialInspection 353016 entity. The MaterialInspection 353014 package includes a Subset 353044 package.

The MaterialInspection 353016 entity has a cardinality of zero or one 353018 meaning that for each instance of the MaterialInspectionDecisionCreateConfirmationMessage_sync 353002 entity there may be one MaterialInspection 353016 entity. The MaterialInspection 353016 entity includes various attributes, namely ID 353020, StatusObject 353026, LifeCycleStatusCode 353032 and LifeCycleStatusName 353038.

The ID 353020 attribute is a MaterialInspectionID 353024 datatype. The ID 353020 attribute has a cardinality of one 353022 meaning that for each instance of the MaterialInspection 353016 entity there is one ID 353020 attribute.

The StatusObject 353026 attribute is a StatusObject 353030 datatype. The StatusObject 353026 attribute has a cardinality of one 353028 meaning that for each instance of the MaterialInspection 353016 entity there is one StatusObject 353026 attribute.

The LifeCycleStatusCode 353032 attribute is a MaterialInspectionLifeCycleStatusCode 353036 datatype. The LifeCycleStatusCode 353032 attribute has a cardinality of one 353034 meaning that for each instance of the MaterialInspection 353016 entity there is one LifeCycleStatusCode 353032 attribute.

The LifeCycleStatusName 353038 attribute is a MEDIUM_Name 353042 datatype. The LifeCycleStatusName 353038 attribute has a cardinality of zero or one 353040 meaning that for each instance of the MaterialInspection 353016 entity there may be one LifeCycleStatusName 353038 attribute.

The Subset 353044 package includes a Decision 353046 entity.

The Decision 353046 entity has a cardinality of one 353048 meaning that for each instance of the MaterialInspection 353016 entity there is one Decision 353046 entity. The Decision 353046 entity includes various attributes, namely ParentQualityIssueCategoryID 353050, ParentQualityIssueCategoryName 353056, QualityIssueCategoryID 353062, QualityIssueCategoryName 353068 and AcceptanceStatusCode 353074.

The ParentQualityIssueCategoryID 353050 attribute is a QualityIssueCategoryID 353054 datatype. The ParentQualityIssueCategoryID 353050 attribute has a cardinality of one 353052 meaning that for each instance of the Decision 353046 entity there is one ParentQualityIssueCategoryID 353050 attribute.

The ParentQualityIssueCategoryName 353056 attribute is a MEDIUM_Name 353060 datatype. The ParentQualityIssueCategoryName 353056 attribute has a cardinality of zero or one 353058 meaning that for each instance of the Decision 353046 entity there may be one ParentQualityIssueCategoryName 353056 attribute.

The QualityIssueCategoryID 353062 attribute is a QualityIssueCategoryID 353066 datatype. The QualityIssueCategoryID 353062 attribute has a cardinality of one 353064 meaning that for each instance of the Decision 353046 entity there is one QualityIssueCategoryID 353062 attribute.

The QualityIssueCategoryName 353068 attribute is a MEDIUM_Name 353072 datatype. The QualityIssueCategoryName 353068 attribute has a cardinality of zero or one 353070 meaning that for each instance of the Decision 353046 entity there may be one QualityIssueCategoryName 353068 attribute.

The AcceptanceStatusCode 353074 attribute is an AcceptanceStatusCode 353078 datatype. The AcceptanceStatusCode 353074 attribute has a cardinality of one 353076 meaning that for each instance of the Decision 353046 entity there is one AcceptanceStatusCode 353074 attribute.

The Log 353080 package is a Log 353086 datatype. The Log 353080 package includes a Log 353082 entity.

The Log 353082 entity has a cardinality of one 353084 meaning that for each instance of the MaterialInspectionDecisionCreateConfirmationMessage_sync 353002 entity there is one Log 353082 entity.

MaterialInspection Package

The MaterialInspection package groups the MaterialInspection with its packages.

MaterialInspection

A document that describes the execution of an inspection for a particular material, and that is used to record this inspection. Material Inspection ID is a unique identifier for a material inspection. StatusObject describes the processing status of a material inspection in structured form. LifeCycleStatusCode describes the current step in the life cycle of the material inspection. LifeCycleStatusName is the name of the current step in the life cycle of the material inspection.

Decision Package

The Decision package groups information of the decision of a MaterialInspection.

Decision

Decision is information about a decision about the further use of the inspected material in the business process. The main purpose of the decision is the rejection or acceptance of the inspected material. ParentQualityIssueCategoryID is an identifier of a parent category of a QualityIssueCategoryCatalogue of type Decision. ParentQualityIssueCategoryName, which can be optional, is a name of the parent category of a QualityIssueCategoryCatalogue of type Decision. QualityIssueCategoryID is an identifier of a category of a QualityIssueCategoryCatalogue of type Decision. QualityIssueCategoryName, which can be optional, is a name of the category of a QualityIssueCategoryCatalogue of type Decision. AcceptanceStatusCode is a valuation of the material inspection with respect to its acceptance or rejection in the continued business process.

MaterialInspectionSample Interfaces

MaterialInspectionSamples supplement the Material Inspection Processing for processing samples by allowing to: flexibly plan the drawing of physical samples; identify physical samples on the basis of unique keys; record inspection results for physical samples; and manage the physical-sample data in the system. MaterialInspectionSamples support many of the requirements in the process industry for documenting and tracking the physical samples drawn in material inspections. It provides the Material Inspection Processing with many of the functions that are typically found in Laboratory Information Management Systems (LIMS). For example, a sample is taken from an inbound delivery of a material for a physical-chemical inspection in a laboratory. Specifications regarding the sample quantity and the sample drawing are stored in the sample data. The inspection scope for the sample is taken from the material inspection (business object MaterialInspection).

Message Choreography

The message choreography of FIG. 371 describes a possible logical sequence of messages that can be used to realize a material inspection sample business scenario.

A MaterialInspectionSampleCreateRequest_sync is a request to Material Inspection Processing to create a MaterialInspectionSample. The structure of the message type MaterialInspectionSampleCreateRequest_sync is specified by a message data type MaterialInspectionSampleCreateRequestMessage_sync.

A MaterialInspectionSampleCreateConfirmation_sync is a confirmation sent from Material Inspection Processing concerning the request to create a MaterialInspectionSample. The structure of the message type MaterialInspectionSampleCreateConfirmation_sync is specified by the message data type MaterialInspectionSampleCreateConfirmationMessage_sync.

A MaterialInspectionSampleByElementsQuery_sync is an inquiry to Material Inspection Processing to return MaterialInspectionSamples based on certain selection criteria. The structure of the message type MaterialInspectionSampleByElementsQuery_sync is specified by the message data type MaterialInspectionSampleByElementsQueryMessage_sync.

A MaterialInspectionSampleByElementsResponse_sync is the response from Material Inspection Processing to the inquiry MaterialInspectionSampleByElementsQuery_sync. The structure of the message type MaterialInspectionSampleByElementsResponse_sync is specified by the message data type MaterialInspectionSampleByElementsResponseMessage_sync.

For example, a "Quality Inspector System" system YFCAE02 can request to create the material inspection sample using the MaterialInspectionSampleCreateRequest_sync message YFCAE06 as shown, for example, in FIG. 375. A "Material Inspection System" system YFCAE04 can confirm the creation request using the MaterialInspectionSampleCreateConfirmation_sync message YFCAE08 as shown, for example, in FIG. 374.

The "Quality Inspector System" system YFCAE02 can request to query the material inspection sample elements using the MaterialInspectionSampleByElementsQuery_sync message YFCAE10 as shown, for example, in FIG. 372. The "Material Inspection System" system YFCAE04 can respond to the query using the MaterialInspectionSampleByElementsResponse_sync message YFCAE12 as shown, for example, in FIG. 373.

Message Data Type

FIGS. 379-1 through 379-3 show a MaterialInspectionSampleCreateRequestMessage 379000 package. The MaterialInspectionSampleCreateRequestMessage 379000 package is a MaterialInspectionSampleCreateRequest 379006 datatype. The MaterialInspectionSampleCreateRequestMessage 379000 package includes a MaterialInspectionSampleCreateRequestMessage 379002 entity. The MaterialInspectionSampleCreateRequestMessage 379000 package includes various packages, namely MessageHeader 379008 and MaterialInspectionSample 379050.

The MessageHeader 379008 package is a BasicBusinessDocumentMessageHeader 379016 datatype. The MessageHeader 379008 package includes a MessageHeader 379010 entity.

The MessageHeader 379010 entity has a cardinality of zero or one 379012 meaning that for each instance of the MaterialInspectionSampleCreateRequestMessage 379002 entity there may be one MessageHeader 379010 entity. The MessageHeader 379010 entity includes various attributes, namely ID 379018, ReferenceID 379026, UUID 379034 and ReferenceUUID 379042.

The ID 379018 attribute is a BusinessDocumentMessageID 379024 datatype. The ID 379018 attribute has a cardinality of zero or one 379020 meaning that for each instance of the MessageHeader 379010 entity there may be one ID 379018 attribute.

The ReferenceID 379026 attribute is a BusinessDocumentMessageID 379032 datatype. The ReferenceID 379026 attribute has a cardinality of zero or one 379028 meaning that for each instance of the MessageHeader 379010 entity there may be one ReferenceID 379026 attribute.

The UUID 379034 attribute is an ATTRIBUTEINDEPENDENT_UUID 379040 datatype. The UUID 379034 attribute has a cardinality of zero or one 379036 meaning that for each instance of the MessageHeader 379010 entity there may be one UUID 379034 attribute.

The ReferenceUUID 379042 attribute is an ATTRIBUTEINDEPENDENT_UUID 379048 datatype. The ReferenceUUID 379042 attribute has a cardinality of zero or one 379044 meaning that for each instance of the MessageHeader 379010 entity there may be one ReferenceUUID 379042 attribute.

The MaterialInspectionSample 379050 package includes a MaterialInspectionSample 379052 entity.

The MaterialInspectionSample 379052 entity has a cardinality of one 379054 meaning that for each instance of the MaterialInspectionSampleCreateRequestMessage 379002 entity there is one MaterialInspectionSample 379052 entity. The MaterialInspectionSample 379052 entity includes various attributes, namely ID 379058, MaterialInspectionID 379066, MaterialInspectionSubsetOperationID 379074, MaterialInternalID 379082, PlantID 379090, BatchID 379098, SupplierID 3790106, SampleDrawingProcedureID 3790114, SampleTakerGivenName 3790122, SampleDrawingDateTime 3790130, TypeCode 3790138, CategoryCode 3790146, InspectionContainerTypeCode 3790154, Quantity 3790162, Description 3790170 and WorkCentreID 3790178.

The ID 379058 attribute is a MaterialInspectionSampleID 379064 datatype. The ID 379058 attribute has a cardinality of zero or one 379060 meaning that for each instance of the MaterialInspectionSample 379052 entity there may be one ID 379058 attribute.

The MaterialInspectionID 379066 attribute is a MaterialInspectionID 379072 datatype. The MaterialInspectionID 379066 attribute has a cardinality of zero or one 379068 meaning that for each instance of the MaterialInspectionSample 379052 entity there may be one MaterialInspectionID 379066 attribute.

The MaterialInspectionSubsetOperationID 379074 attribute is a MaterialInspectionSubsetOperationID 379080 datatype. The MaterialInspectionSubsetOperationID 379074 attribute has a cardinality of zero or one 379076 meaning that for each instance of the MaterialInspectionSample 379052 entity there may be one MaterialInspectionSubsetOperationID 379074 attribute.

The MaterialInternalID 379082 attribute is a ProductInternalID 379088 datatype. The MaterialInternalID 379082 attribute has a cardinality of zero or one 379084 meaning that for each instance of the MaterialInspectionSample 379052 entity there may be one MaterialInternalID 379082 attribute.

The PlantID 379090 attribute is a PlantID 379096 datatype. The PlantID 379090 attribute has a cardinality of zero or one 379092 meaning that for each instance of the MaterialInspectionSample 379052 entity there may be one PlantID 379090 attribute.

The BatchID 379098 attribute is a BatchID 3790104 datatype. The BatchID 379098 attribute has a cardinality of zero or one 3790100 meaning that for each instance of the MaterialInspectionSample 379052 entity there may be one BatchID 379098 attribute.

The SupplierID 3790106 attribute is a SupplierID 3790112 datatype. The SupplierID 3790106 attribute has a cardinality of zero or one 3790108 meaning that for each instance of the MaterialInspectionSample 379052 entity there may be one SupplierID 3790106 attribute.

The SampleDrawingProcedureID 3790114 attribute is a SampleDrawingProcedureID 3790120 datatype. The SampleDrawingProcedureID 3790114 attribute has a cardinality of zero or one 3790116 meaning that for each instance of the MaterialInspectionSample 379052 entity there may be one SampleDrawingProcedureID 3790114 attribute.

The SampleTakerGivenName 3790122 attribute is a Name 3790128 datatype. The SampleTakerGivenName 3790122 attribute has a cardinality of zero or one 3790124 meaning that for each instance of the MaterialInspectionSample 379052 entity there may be one SampleTakerGivenName 3790122 attribute.

The SampleDrawingDateTime 3790130 attribute is a TIMEZONEINDEPENDENT_DateTime 3790136 datatype. The SampleDrawingDateTime 3790130 attribute has a cardinality of zero or one 3790132 meaning that for each instance of the MaterialInspectionSample 379052 entity there may be one SampleDrawingDateTime 3790130 attribute.

The TypeCode 3790138 attribute is an InspectionSampleTypeCode 3790144 datatype. The TypeCode 3790138 attribute has a cardinality of one 3790140 meaning that for each instance of the MaterialInspectionSample 379052 entity there is one TypeCode 3790138 attribute.

The CategoryCode 3790146 attribute is an InspectionSampleCategoryCode 3790152 datatype. The CategoryCode 3790146 attribute has a cardinality of one 3790148 meaning that for each instance of the MaterialInspectionSample 379052 entity there is one CategoryCode 3790146 attribute.

The InspectionContainerTypeCode 3790154 attribute is an InspectionContainerTypeCode 3790160 datatype. The InspectionContainerTypeCode 3790154 attribute has a cardinality of one 3790156 meaning that for each instance of the MaterialInspectionSample 379052 entity there is one InspectionContainerTypeCode 3790154 attribute.

The Quantity 3790162 attribute is a Quantity 3790168 datatype. The Quantity 3790162 attribute has a cardinality of one 3790164 meaning that for each instance of the MaterialInspectionSample 379052 entity there is one Quantity 3790162 attribute.

The Description 3790170 attribute is a Medium_Description 3790176 datatype. The Description 3790170 attribute has a cardinality of zero or one 3790172 meaning that for each instance of the MaterialInspectionSample 379052 entity there may be one Description 3790170 attribute.

The WorkCentreID 3790178 attribute is a WorkCentreID 3790184 datatype. The WorkCentreID 3790178 attribute has a cardinality of zero or one 3790180 meaning that for each instance of the MaterialInspectionSample 379052 entity there may be one WorkCentreID 3790178 attribute.

MessageHeader Package

The MessageHeader package groups the business information that is relevant for sending a business document in a message. It contains a MessageHeader entity.

MessageHeader

The MessageHeader entity groups business information from the perspective of the sending application, and includes information to identify the business document in a message.

MaterialInspectionSample Package

The MaterialInspectionSamplepackage contains the MaterialInspectionSample entity.

MaterialInspectionSample

A sample required for an examination in the context of a material inspection. The sample is the subject of examination for inspection procedures. A sample can be drawn from a material independently of a material inspection and, if necessary, it can later be assigned to a material inspection. The sample contains an ID, a Material InspectionID, a MaterialInspectionSubsetOperationID, a MaterialInternalID, a PlantID, a BatchID, a SupplierID, a SampleDrawing ProcedureID, a SampleTakerGivenName, a SampleDrawing DateTime, a TypeCode, a CategoryCode, an Inspection Container TypeCode, a Quantity, a Description, and a WorkCentreID. The ID is a unique identifier for a material inspection sample. The MaterialInspectionID is a unique identifier for a material inspection. The MaterialInspectionSubsetOperationID is an identifier of a material inspection operation. The MaterialInternalID is a unique identifier of the material to be inspected. The PlantID is an identifier for the plant of the material to be inspected. The BatchID is an identifier for a batch of the material to be inspected. The SupplierID is a unique identifier of the supplier of the material to be inspected. The SampleDrawingProcedureID is a unique identifier of the sample-drawing procedure. The SampleTakerGivenName is a person who took the sample from the total quantity to be inspected. The SampleDrawingDateTime is the time at which the sample was taken. The TypeCode is the coded representation of the type of a sample. The sample type describes the process in which the material is to be inspected using samples. It also describes where this process is taking place. It is the controlling element of the sample, for example, goods receipt sample or production sample. The CategoryCode is the coded representation of the category of a sample. The sample category specifies if the sample is a primary, pooled, or reserve sample. The InspectionContainerTypeCode is the coded representation of the type of container in which the sample is transported and stored. The Quantity is the quantity required for a primary, pooled, or reserve sample. The Description is the description of the sample. The WorkCentreID is an identifier of the work centre where the sample is inspected. A material can be assigned to the sample if the sample is created independently of a material-inspection. If a sample is assigned to a material inspection, the material in the sample can correspond to the material of this inspection.

Message Data Type

FIG. 378 shows a MaterialInspectionSampleCreateConfirmationMessage 378000 package. The MaterialInspectionSampleCreateConfirmationMessage 378000 package is a MaterialInspectionSampleCreateConfirmation 378006 datatype. The MaterialInspectionSampleCreateConfirmationMessage 378000 package includes a MaterialInspectionSampleCreateConfirmationMessage 378002 entity. The MaterialInspectionSampleCreateConfirmationMessage 378000 package includes various packages, namely MessageHeader 379008, MaterialInspectionSample 378050 and Log 378060.

The MessageHeader 379008 package is a BasicBusinessDocumentMessageHeader 378016 datatype. The MessageHeader 379008 package includes a MessageHeader 378010 entity.

The MessageHeader 378010 entity has a cardinality of zero or one 378012 meaning that for each instance of the MaterialInspectionSampleCreateConfirmationMessage 378002 entity there may be one MessageHeader 378010 entity. The MessageHeader 378010 entity includes various attributes, namely ID 378018, ReferenceID 378026, UUID 378034 and ReferenceUUID 378042.

The ID 378018 attribute is a BusinessDocumentMessageID 378024 datatype. The ID 378018 attribute has a cardinality of zero or one 378020 meaning that for each instance of the MessageHeader 378010 entity there may be one ID 378018 attribute.

The ReferenceID 378026 attribute is a BusinessDocumentMessageID 378032 datatype. The ReferenceID 378026 attribute has a cardinality of zero or one 378028 meaning that for each instance of the MessageHeader 378010 entity there may be one ReferenceID 378026 attribute.

The UUID 378034 attribute is an ATTRIBUTEINDEPENDENT_UUID 378040 datatype. The UUID 378034 attribute has a cardinality of zero or one 378036 meaning that for each instance of the MessageHeader 378010 entity there may be one UUID 378034 attribute.

The ReferenceUUID 378042 attribute is an ATTRIBUTEINDEPENDENT_UUID 378048 datatype. The ReferenceUUID 378042 attribute has a cardinality of zero or one 378044 meaning that for each instance of the MessageHeader 378010 entity there may be one ReferenceUUID 378042 attribute.

The MaterialInspectionSample 378050 package includes a MaterialInspectionSample 378052 entity.

The MaterialInspectionSample 378052 entity has a cardinality of zero or one 378054 meaning that for each instance of the MaterialInspectionSampleCreateConfirmationMessage 378002 entity there may be one MaterialInspectionSample 378052 entity. The MaterialInspectionSample 378052 entity includes various attributes, namely ID 378058 and StatusObject 378052.

The ID 378058 attribute is a MaterialInspectionSampleID 378064 datatype. The ID 378058 attribute has a cardinality of one 378060 meaning that for each instance of the MaterialInspectionSample 378052 entity there is one ID 378058 attribute.

The StatusObject 378052 attribute is a StatusObject 378058 datatype. The StatusObject 378052 attribute has a cardinality of zero or one 378054 meaning that for each instance of the MaterialInspectionSample 378052 entity there may be one StatusObject 378052 attribute.

The Log 378060 package is a Log 378068 datatype. The Log 378060 package includes a Log 378062 entity.

The Log 378062 entity has a cardinality of one 378064 meaning that for each instance of the MaterialInspectionSampleCreateConfirmationMessage 378002 entity there is one Log 378062 entity.

MaterialInspectionSample Package

The MaterialInspectionSample package contains the entity MaterialInspectionSample.

MaterialInspectionSample

A sample can be used for an examination in the context of a material inspection. The sample is the subject of examination for inspection procedures. A sample can be drawn from a material independently of a material inspection and, if necessary, it can later be assigned to a material inspection. The ID is a unique identifier for a sample. The StatusObject describes the processing status of a material inspection sample in structured form.

Log Package

A Log package groups the error messages used for user interaction. It contains the entity Log.

Log

A Log is a sequence of messages that result when an application executes a task.

Message Data Type

The message data type MaterialInspectionSampleByElementsQueryMessage_sync contains the Selection for the MaterialInspectionSample and the processing conditions. It contains the packages Selection package and ProcessingConditions package.

FIGS. 376-1 through 376-2 show a MaterialInspectionSampleByElementsQueryMessage 376000 package. The MaterialInspectionSampleByElementsQueryMessage 376000 package is a MaterialInspectionByElementsQuery 376006 datatype. The MaterialInspectionSampleByElementsQueryMessage 376000 package includes a MaterialInspectionSampleByElementsQueryMessage 376002 entity. The MaterialInspectionSampleByElementsQueryMessage 376000 package includes various packages, namely Selection 376008 and ProcessingConditions 376084.

The Selection 376008 package includes a MaterialInspectionSampleSelectionByElements 376010 entity.

The MaterialInspectionSampleSelectionByElements 376010 entity has a cardinality of one 376012 meaning that for each instance of the MaterialInspectionSampleByElementsQueryMessage 376002 entity there is one MaterialInspectionSampleSelectionByElements 376010 entity. The MaterialInspectionSampleSelectionByElements 376010 entity includes various attributes, namely ID 376014, SampleDrawingProcedureID 376022, MaterialInspectionID 376030, MaterialInternalID 376038, PlantID 376044, BatchID 376052, SupplierID 376060, TypeCode 376068 and CategoryCode 376076.

The ID 376014 attribute is a MaterialInspectionSampleID 376020 datatype. The ID 376014 attribute has a cardinality of zero or one 376016 meaning that for each instance of the MaterialInspectionSampleSelectionByElements 376010 entity there may be one ID 376014 attribute.

The SampleDrawingProcedureID 376022 attribute is a SampleDrawingProcedureID 37600028 datatype. The SampleDrawingProcedureID 376022 attribute has a cardinality of zero or one 376024 meaning that for each instance of the MaterialInspectionSampleSelectionByElements 376010 entity there may be one SampleDrawingProcedureID 376022 attribute.

The MaterialInspectionID 376030 attribute is a MaterialInspectionID 376036 datatype. The MaterialInspectionID 376030 attribute has a cardinality of zero or one 376032 meaning that for each instance of the MaterialInspectionSampleSelectionByElements 376010 entity there may be one MaterialInspectionID 376030 attribute.

The MaterialInternalID 376038 attribute is a ProductInternalID 376044 datatype. The MaterialInternalID 376038 attribute has a cardinality of zero or one 376040 meaning that for each instance of the MaterialInspectionSampleSelectionByElements 376010 entity there may be one MaterialInternalID 376038 attribute.

The PlantID 376044 attribute is a PlantID 376050 datatype. The PlantID 376044 attribute has a cardinality of zero or one 376046 meaning that for each instance of the MaterialInspectionSampleSelectionByElements 376010 entity there may be one PlantID 376044 attribute.

The BatchID 376052 attribute is a BatchID 376058 datatype. The BatchID 376052 attribute has a cardinality of zero or one 376054 meaning that for each instance of the MaterialInspectionSampleSelectionByElements 376010 entity there may be one BatchID 376052 attribute.

The SupplierID 376060 attribute is a SupplierID 376066 datatype. The SupplierID 376060 attribute has a cardinality of zero or one 376062 meaning that for each instance of the MaterialInspectionSampleSelectionByElements 376010 entity there may be one SupplierID 376060 attribute.

The TypeCode 376068 attribute is an InspectionSampleTypeCode 376074 datatype. The TypeCode 376068 attribute has a cardinality of zero or one 376070 meaning that for each instance of the MaterialInspectionSampleSelectionByElements 376010 entity there may be one TypeCode 376068 attribute.

The CategoryCode 376076 attribute is an InspectionSampleCategoryCode 376082 datatype. The CategoryCode 376076 attribute has a cardinality of zero or one 376078 meaning that for each instance of the MaterialInspectionSampleSelectionByElements 376010 entity there may be one CategoryCode 376076 attribute.

The ProcessingConditions 376084 package includes a ProcessingConditions 376086 entity.

The ProcessingConditions 376086 entity has a cardinality of one meaning that for each instance of the MaterialInspectionSampleByElementsQueryMessage 376002 entity there is one ProcessingConditions 376086 entity. The ProcessingConditions 376086 entity includes various attributes, namely QueryHitsMaximumNumberValue 376090 and UnlimitedQueryHitsIndicator 376098.

The QueryHitsMaximumNumberValue 376090 attribute is a NumberValue 376096 datatype. The QueryHitsMaximumNumberValue 376090 attribute has a cardinality of zero or one 376092 meaning that for each instance of the ProcessingConditions 376086 entity there may be one QueryHitsMaximumNumberValue 376090 attribute.

The UnlimitedQueryHitsIndicator 376098 attribute is an Indicator 3760104 datatype. The UnlimitedQueryHitsIndicator 376098 attribute has a cardinality of zero or one 3760100 meaning that for each instance of the ProcessingConditions 376086 entity there may be one UnlimitedQueryHitsIndicator 376098 attribute.

Selection Package

The Selection package collects at least some of the selection criteria for MaterialInspectionSample. Selection contains the entity MaterialInspectionSampleSelectionByElements.

MaterialInspectionSampleSelectionByElements

MaterialInspectionSampleSelectionByElements specifies selection criteria to select. The MaterialInspectionSample. The ID, which can be optional, is a unique identifier for a sample. The SampleDrawingProcedureID, which can be optional, is a unique identifier of the sample-drawing procedure. The MaterialInspectionID, which can be optional, is a unique identifier for a material inspection. The MaterialInternalID, which can be optional, is a unique identifier of the material to be inspected. The PlantID, which can be optional, is an identifier for the plant of the material to be inspected. The BatchID, which can be optional, is an identifier for a batch of the material to be inspected. The SupplierID, which can be optional, is a unique identifier of the supplier of the material to be inspected. The TypeCode, which can be optional, is a coded representation of the type of a sample. The CategoryCode, which can be optional, is a coded representation of the category of a sample.

ProcessingConditions Package

The ProcessingConditions package groups means for a maximum output data size. It contains the entity ProcessingConditions.

ProcessingConditions

ProcessingConditions specifies criteria to restrict selection of processed data. The QueryHitsMaximumNumberValue, which can be optional, is the number of hits to be returned by the query. Typically, the default value can be set to 100. The UnlimitedQueryHitsIndicator, which can be optional, —Indicator to return at least some available hits. When set to true, in some examples, no value is provided for QueryHitsMaximumNumberValue.

Message Data Type

FIG. 373 shows an example of a Message Data Type MaterialInspectionSampleByElementsResponseMessage_sync.

The message data type MaterialInspectionSampleByElementsResponseMessage_sync contains the MaterialInspectionSample included in the business document, the Processing Conditions and the Log. It contains the packages MaterialInspectionSample, ProcessingConditions, and Log.

FIGS. 377-1 through 377-4 show a MaterialInspectionSampleByElementsResponseMessage 377000 package. The MaterialInspectionSampleByElementsResponseMessage 377000 package is a MaterialInspectionSampleByElementsResponse 377006 datatype. The MaterialInspectionSampleByElementsResponseMessage 377000 package includes a MaterialInspectionSampleByElementsResponseMessage 377002 entity. The MaterialInspectionSampleByElementsResponseMessage 377000 package includes various packages, namely MaterialInspectionSample 377008, ProcessingConditions 3770182 and 3770206.

The MaterialInspectionSample 377008 package includes a MaterialInspectionSample 377010 entity.

The MaterialInspectionSample 377010 entity has a cardinality of zero or n 377012 meaning that for each instance of the MaterialInspectionSampleByElementsResponseMessage 377002 entity there may be one or more MaterialInspectionSample 377010 entities. The MaterialInspectionSample 377010 entity includes various attributes, namely ID 377014, SystemAdministrativeData 377022, StatusObject 377030, MaterialInternalID 377038, MaterialDescription 377046, SupplierID 377054, SupplierFormattedName 377062, SampleDrawingProcedureID 377070, SampleTakerGivenName 377078, SampleDrawingDateTime 377086, ProcessorPersonName 377094, TypeCode 3770102, TypeName 3770110, CategoryCode 3770118, CategoryName 3770126, InspectionContainerTypeCode 3770134, InspectionContainerTypeName 3770142, Quantity 3770150, Description 3770158, WorkCentreID 3770166 and WorkCentreDescription 3770174.

The ID 377014 attribute is a MaterialInspectionSampleID 377020 datatype. The ID 377014 attribute has a cardinality of one 377016 meaning that for each instance of the MaterialInspectionSample 377010 entity there is one ID 377014 attribute.

The SystemAdministrativeData 377022 attribute is a SystemAdministrativeData 377028 datatype. The SystemAdministrativeData 377022 attribute has a cardinality of one 377024 meaning that for each instance of the MaterialInspectionSample 377010 entity there is one SystemAdministrativeData 377022 attribute.

The StatusObject 377030 attribute is a StatusObject 377036 datatype. The StatusObject 377030 attribute has a cardinality of one 377032 meaning that for each instance of the MaterialInspectionSample 377010 entity there is one StatusObject 377030 attribute.

The MaterialInternalID 377038 attribute is a ProductInternalID 377044 datatype. The MaterialInternalID 377038 attribute has a cardinality of zero or one 377040 meaning that for each instance of the MaterialInspectionSample 377010 entity there may be one MaterialInternalID 377038 attribute.

The MaterialDescription 377046 attribute is a SHORT_Description 377052 datatype. The MaterialDescription 377046 attribute has a cardinality of zero or one 377048 meaning that for each instance of the MaterialInspectionSample 377010 entity there may be one MaterialDescription 377046 attribute.

The SupplierID 377054 attribute is a SupplierID 377060 datatype. The SupplierID 377054 attribute has a cardinality of zero or one 377056 meaning that for each instance of the MaterialInspectionSample 377010 entity there may be one SupplierID 377054 attribute.

The SupplierFormattedName 377062 attribute is a LONG_Name 377068 datatype. The SupplierFormattedName 377062 attribute has a cardinality of zero or one 377064 meaning that for each instance of the MaterialInspectionSample 377010 entity there may be one SupplierFormattedName 377062 attribute.

The SampleDrawingProcedureID 377070 attribute is a SampleDrawingProcedureID 377076 datatype. The SampleDrawingProcedureID 377070 attribute has a cardinality of zero or one 377072 meaning that for each instance of the MaterialInspectionSample 377010 entity there may be one SampleDrawingProcedureID 377070 attribute.

The SampleTakerGivenName 377078 attribute is a Name 377084 datatype. The SampleTakerGivenName 377078 attribute has a cardinality of zero or one 377080 meaning that for each instance of the MaterialInspectionSample 377010 entity there may be one SampleTakerGivenName 377078 attribute.

The SampleDrawingDateTime 377086 attribute is a TIMEZONEINDEPENDENT_DateTime 377092 datatype. The SampleDrawingDateTime 377086 attribute has a cardinality of zero or one 377088 meaning that for each instance of the MaterialInspectionSample 377010 entity there may be one SampleDrawingDateTime 377086 attribute.

The ProcessorPersonName 377094 attribute is a PersonName 3770100 datatype. The ProcessorPersonName 377094 attribute has a cardinality of zero or one 377096 meaning that for each instance of the MaterialInspectionSample 377010 entity there may be one ProcessorPersonName 377094 attribute.

The TypeCode 3770102 attribute is an InspectionSampleTypeCode 3770108 datatype. The TypeCode 3770102 attribute has a cardinality of one 3770104 meaning that for each instance of the MaterialInspectionSample 377010 entity there is one TypeCode 3770102 attribute.

The TypeName 3770110 attribute is a MEDIUM_Name 3770116 datatype. The TypeName 3770110 attribute has a cardinality of zero or one 3770112 meaning that for each instance of the MaterialInspectionSample 377010 entity there may be one TypeName 3770110 attribute.

The CategoryCode 3770118 attribute is an InspectionSampleCategoryCode 3770124 datatype. The CategoryCode 3770118 attribute has a cardinality of one 3770120 meaning that for each instance of the MaterialInspectionSample 377010 entity there is one CategoryCode 3770118 attribute.

The CategoryName 3770126 attribute is a MEDIUM_Name 3770132 datatype. The CategoryName 3770126 attribute has a cardinality of zero or one 3770128 meaning that for each instance of the MaterialInspectionSample 377010 entity there may be one CategoryName 3770126 attribute.

The InspectionContainerTypeCode 3770134 attribute is an InspectionContainerTypeCode 3770140 datatype. The InspectionContainerTypeCode 3770134 attribute has a cardinality of one 3770136 meaning that for each instance of the MaterialInspectionSample 377010 entity there is one InspectionContainerTypeCode 3770134 attribute.

The InspectionContainerTypeName 3770142 attribute is a MEDIUM_Name 3770148 datatype. The InspectionContainerTypeName 3770142 attribute has a cardinality of zero or one 3770144 meaning that for each instance of the MaterialInspectionSample 377010 entity there may be one InspectionContainerTypeName 3770142 attribute.

The Quantity 3770150 attribute is a Quantity 3770156 datatype. The Quantity 3770150 attribute has a cardinality of one 3770152 meaning that for each instance of the MaterialInspectionSample 377010 entity there is one Quantity 3770150 attribute.

The Description 3770158 attribute is a Medium_Description 3770164 datatype. The Description 3770158 attribute has a cardinality of zero or one 3770160 meaning that for each instance of the MaterialInspectionSample 377010 entity there may be one Description 3770158 attribute.

The WorkCentreID 3770166 attribute is a WorkCentreID 3770172 datatype. The WorkCentreID 3770166 attribute has a cardinality of zero or one 3770168 meaning that for each instance of the MaterialInspectionSample 377010 entity there may be one WorkCentreID 3770166 attribute.

The WorkCentreDescription 3770174 attribute is a SHORT_Description 3770180 datatype. The WorkCentreDescription 3770174 attribute has a cardinality of zero or one 3770176 meaning that for each instance of the MaterialInspectionSample 377010 entity there may be one WorkCentreDescription 3770174 attribute.

The ProcessingConditions 3770182 package includes a ProcessingConditions 3770184 entity.

The ProcessingConditions 3770184 entity has a cardinality of one 3770186 meaning that for each instance of the MaterialInspectionSampleByElementsResponseMessage 377002 entity there is one ProcessingConditions 3770184 entity. The ProcessingConditions 3770184 entity includes various attributes, namely ReturnedQueryHitsNumberValue 3770190 and MoreElementsAvailableIndicator 3770198.

The ReturnedQueryHitsNumberValue 3770190 attribute is a NumberValue 3770196 datatype. The ReturnedQueryHitsNumberValue 3770190 attribute has a cardinality of one 3770192 meaning that for each instance of the ProcessingConditions 3770184 entity there is one ReturnedQueryHitsNumberValue 3770190 attribute.

The MoreElementsAvailableIndicator 3770198 attribute is an Indicator 3770204 datatype. The MoreElementsAvailableIndicator 3770198 attribute has a cardinality of one 3770200 meaning that for each instance of the ProcessingConditions 3770184 entity there is one MoreElementsAvailableIndicator 3770198 attribute.

The 3770206 package is a Log 3770214 datatype. The 3770206 package includes a Log 3770208 entity.

The Log 3770208 entity has a cardinality of one 3770210 meaning that for each instance of the MaterialInspectionSampleByElementsResponseMessage 377002 entity there is one Log 3770208 entity.

MaterialInspectionSample Package

The MaterialInspectionSample contains the entity MaterialInspectionSample.

MaterialInspectionSample

A sample used for an examination in the context of a material inspection. The ID is a unique identifier for a sample. The SystemAdministrativeData is an administrative data that is stored in a system. This data includes system users and change dates/times. The StatusObject describes the processing status of a material inspection sample in structured form. The MaterialInternalID, which can be optional, is a unique identifier of the material to be inspected. The MaterialDescription, which can be optional, describes the material to be inspected. The SupplierID, which can be optional, is a unique identifier of the supplier of the material to be inspected. The SupplierFormattedName, which can be optional, is the complete, formatted name of the supplier of the material to be inspected. The SampleDrawingProcedureID, which can be optional, is a unique identifier of the sample-drawing procedure. The SampleTakerGivenName, which can be optional, is the person who took the sample from the total quantity to be inspected. The SampleDrawingDateTime, which can be optional, is the time at which the sample was taken. The TypeCode is the coded representation of the type of a sample. The sample type describes the process in which the material is to be inspected using samples. It also describes where this process is taking place. It is the controlling element of the sample, for example, goods receipt sample, production sample. The TypeName, which can be optional, is the name of the type of a sample. The CategoryCode is the coded representation of the category of a sample. The sample category can specify if the sample is a primary, pooled, or reserve sample. The CategoryName, which can be optional, is the name of the category of a sample. The InspectionContainerTypeCode. The coded representation of the type of container in which the sample is trans-ported and stored. The InspectionContainerTypeName, which can be optional, is the name of the type of container. The Quantity is the quantity required for a primary, pooled, or reserve sample. The Description, which can be optional, is the description of the sample. The WorkCentreID, which can be optional, is a unique identifier of the work centre where the sample is inspected. The WorkCentreDescription, which can be optional, is the name of the work centre where the sample is inspected.

ProcessingConditions Package

The ProcessingConditions package groups means for a maximum output data size. It contains the entity ProcessingConditions.

ProcessingConditions

ProcessingConditions specifies criteria to restrict selection of processed data. The ReturnedQueryHitsNumberValue is the number of hits returned by the query. The MoreElementsAvailableIndicator is the indicator to show that there are more hits available PaymentCardPaymentAuthorisation Interfaces Payment cards are used during payment processes. Authorization of the payment amounts are requested from a clearing house or a bank. After the authorization process with the clearing house or bank has been completed, the settlement is done to complete the trans-action (the settlement is not part of the interfaces described in this document).

Message Choreography

The message choreography of FIG. 380 describes a possible logical sequence of messages that can be used to realize a payment card payment authorisation business scenario.

PaymentCardPaymentAuthorisationRequest_sync is a request from a payee to a clearing house or bank to authorize for a payment card payment. The structure of the message type PaymentCardPaymentAuthorisationRequest_sync is specified by the message data type PaymentCardPaymentAuthorisationRequestMessage_sync.

PaymentCardPaymentAuthorisationConfirmation_sync is the confirmation to a PaymentCardPaymentAuthorisationRequest_sync. The structure of the message type PaymentCardPaymentAuthorisationConfirmation_sync is specified by the message data type PaymentCardPaymentAuthorisationConfirmationMessage_sync.

PaymentCardPaymentAuthorisationPreAuthorisationQuery_sync is a query from a payee to a clearing house or bank for a pre-authorization of a payment card payment. The structure of the message type PaymentCardPaymentAuthorisationPreAuthorisationQuery_sync is specified by the message data type PaymentCardPaymentAuthorisationPreAuthorisationQueryMessage_sync.

PaymentCardPaymentAuthorisationPreAuthorisationResponse_sync is the response to a PaymentCardPaymentAuthorisationPreAuthorisationQuery_sync. The structure of the message type PaymentCardPaymentAuthorisationPreAuthorisationResponse_sync is specified by the message data type PaymentCardPaymentAuthorisationPreAuthorisationResponseMessage_sync.

PaymentCardPaymentAuthorisationCancelRequest_sync is a request from a payee to a clearing house or a bank to cancel an authorization of a payment card payment. The structure of the message type PaymentCardPaymentAuthorisationCancelRequest_sync is specified by the message data type PaymentCardPaymentAuthorisationCancelRequestMessage_sync.

PaymentCardPaymentAuthorisationCancelConfirmation_sync is the confirmation to a PaymentCardPaymentAuthorisationCancelRequest_sync. The structure of the message type PaymentCardPaymentAuthorisationCancelConfirmation_sync is specified by the message data type PaymentCardPaymentAuthorisationCancelConfirmationMessage_sync.

For example, a "Payee" system 380002 can query a payment card payment authorisation preauthorisation using the PaymentCardPaymentAuthorisationPreAuthorisationQuery_sync message 380006 as shown, for example, in FIG. 384. A "Clearing House" system 380004 can respond to the query using the PaymentCardPaymentAuthorisationPreAuthorisationResponse_sync message 380008 as shown, for example, in FIG. 385. The "Payee" system 380002 can request a payment card payment authorisation using the PaymentCardPaymentAuthorisationRequest_sync message 380010 as shown, for example, in FIG. 386. The "Clearing House" system 380004 can confirm the request using the PaymentCardPaymentAuthorisationConfirmation_sync message 380012 as shown, for example, in FIG. 383. The "Payee" system 380002 can request to cancel a payment card payment authorisation using the PaymentCardPaymentAuthorisationCancelRequest_sync message 380014 as shown, for example, in FIG. 382. The "Clearing House" system 380004 can confirm the request using the PaymentCardPaymentAuthorisationCancelConfirmation_sync message 380016 as shown, for example, in FIG. 381.

Message Data Type

The message data type PaymentCardPaymentAuthorisationRequestMessage_sync 380010 of FIG. 386 contains entity PaymentCardPaymentAuthorisationRequestMessage_sync 386004 and the packages MessageHeader 386006 and PaymentCardPaymentAuthorisation 386010.

MessageHeader Package

The MessageHeader 386006 package groups the business information that is relevant for sending a business document in a message. It contains entity MessageHeader 386008.

MessageHeader

The MessageHeader 386008 groups business information from the perspective of the sending application, such as information to identify the business document in a message, information about the sender, and (optionally) information about the recipient. The MessageHeader 386008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

PaymentCardPaymentAuthorisation Package

The PaymentCardPaymentAuthorisation package 386010 groups the PaymentCardPaymentAuthorisation and its packages. It contains entity PaymentCardPaymentAuthorisation 386012 and packages Party 386020, Previous Authorisation 386026, and PaymentExplanationItem 386014.

PaymentCardPaymentAuthorisation

Authorization for a payment by payment card given by a clearing house to a payee. The PaymentCardPaymentAuthorisation 386012 not only contains the authorisation for a payment card payment. It also includes data related to the processing, e.g., item information of a business transaction document reference may be included.

The PaymentCardPaymentAuthorisation entity 386012 contains the elements ID, DeviceID, PaymentCardHolderAuthenticationID, PaymentCardHolderAuthenticationResultCode, PaymentCardHolderAuthenticationTokenText, PaymentCardVerificationValueAvailabilityCode, PaymentCardVerificationValueCheckRequiredIndicator, PaymentAmount, PaymentCardVerificationValueText, PaymentCard, PaymentCardChargedBusinessTransactionDocumentBankAccount, and Location. The ID is a unique identifier of the payment card payment. It is of type GDT: BusinessTransactionDocumentID. The DeviceID, which can be optional, is an identifier for an input or output device in computing, such as the IP address. It is of type GDT: DeviceID. The PaymentCardHolderAuthenticationID, which can be optional, is an identifier for a payment card holder authentication. It is of type GDT: PaymentCardHolderAuthenticationID. The PaymentCardHolderAuthenticationResultCode, which can be optional, is the coded representation of the result of a cardholder authentication. It is of type GDT: PaymentCardHolderAuthenticationResultCode. The PaymentCardHolderAuthenticationTokenText, which can be optional, is a value of the result of the PaymentCardHolder authentication check, performed by the Interoperability Domain. It is of type GDT: PaymentCardHolderAuthenticationTokenText. The PaymentCardVerificationValueAvailabilityCode, which can be optional, is information regarding the availability of verification code on a payment card. It is of type GDT: PaymentCardVerificationValueAvailabilityCode. PaymentCardVerificationValueCheckRequiredIndicator can indicate whether or not the CardVerificationValue should be transferred in the authorization message. It is of type GDT: Indicator with a Qualifier of Required. PaymentAmount is the payment amount in transaction currency. It is of type GDT: Amount with a Qualifier of Payment. PaymentCardVerificationValueText, which can be optional, is the verification code of payment cards. It is of type GDT: PaymentCardVerificationValueText. PaymentCard is an identification card that authorizes the holder to settle invoices without cash with contract companies connected to the payment system. It is of type (GDT: PaymentCard). The PaymentCardChargedBusinessTransactionDocumentBankAccount, which can be optional, is the bank account of the payment card which is charged in payment card payment. It is of type GDT: BusinessTransactionDocumentBankAccount with a Qualifier of PaymentCardCharged. The Location, which can be optional, is a place where the transaction took place. It is of type GDT: BusinessTransactionDocumentLocation.

Party Package

The Party package 386020 contains the entities PayerParty 386024 and PayeeParty 386022.

PayeeParty

The PayeeParty 386022 is a party that receives payment for goods or services provided. The PayeeParty 386022, which can be optional, is of type GDT: BusinessTransactionDocumentParty.

PayerParty

The PayerParty 386024 is a party that pays for goods or services. The PayerParty 386024, which can be optional, is of type GDT: BusinessTransactionDocumentParty.

PreviousAuthorisation Package

The PreviousAuthorisation package 386026 contains the entity PreviousAuthorisation 386028.

PreviousAuthorisation

PreviousAuthorisation 386028 contains the elements PaymentCardPaymentAuthorisationRequestorID, PaymentCardPaymentAuthorisationClearingHouseID, PaymentAuthorisationDateTime, and AuthorisationPaymentAmount. The PaymentCardPaymentAuthorisationRequestorID, which can be optional, is an identifier for an authorization of a card payment that is assigned by the company. It is of type GDT: PaymentCardPaymentAuthorisationPartyID; Role Requestor. The PaymentCardPaymentAuthorisationClearingHouseID, which can be optional, is an identifier for an authorization of a card payment that is assigned by a clearing house for card payments. It is of type GDT: PaymentCardPaymentAuthorisationPartyID; Role ClearingHouse. The PaymentAuthorisationDateTime, which can be optional, is a date on which the authorization check was carried out. It is of type GDT: GLOBAL_DateTime; Qualifier Authorisation. The AuthorisationPaymentAmount, which can be optional, is a payment amount in transaction currency. It is of type GDT: Amount, Qualifier: Payment. Typically, at least one of these 4 elements should be filled.

PaymentExplanationItem Package

The PaymentExplanationItem package 386014 contains the entity PaymentExplanationItem 386016 and package Product 386018.

PaymentExplanationItem

The PaymentExplanationItem 386016 is an item that explains a payment card payment for which authorization is requested, in particular, contains product and quantity of a related sales order or invoice. The elements located directly at the PaymentOrderPaymentAuthorisationItem node are BusinessTransactionDocumentReference, CreationDate, and RequestedQuantity. The BusinessTransactionDocumentReference is a unique reference to other business documents or business document items. It is of type GDT: BusinessTransactionDocumentReference. The CreationDate, which can be optional, is the date at which the PaymentOrderPaymentAuthorisationItem was created. It is of type GDT: GLOBAL_DateTime, Qualifier: Creation. The RequestedQuantity, which can be optional, is the quantity which is requested. It is of type GDT: Quantity, Qualifier: Requested.

Product Package

The Product Package 386018 contains the entity Product.

Product

Product includes product specific data of the business transaction. A product is commodity that is the object of the business activity of a company and serves to generate value for this company. It can be tangible or intangible. A product can have relationships to other products or objects. For example, there can be a service for a specially manufactured product. The element located directly at the Product node is the BusinessTransactionDocumentProduct which contains the information that is exchanged in business documents about a product. It is of type GDT: BusinessTransactionDocumentProduct.

Message Data Type

The message data type PaymentCardPaymentAuthorisationConfirmationMessage_sync 380012 of FIG. 383 contains entity PaymentCardPaymentAuthorisationConfirmationMessage_sync 383004 and packages MessageHeader 383006, PaymentCardPaymentAuthorisation 383010, and Log 383014. The message data type PaymentCardPaymentAuthorisationConfirmationMessage_sync 383008, therefore, provides the structure for the message type PaymentCardPaymentAuthorisationConfirmation_sync and the interfaces that are based on it.

MessageHeader Package

The MessageHeader 383006 package groups the business information that is relevant for sending a business document in a message. It contains the entity MessageHeader 383008.

MessageHeader

The MessageHeader 383008 groups business information from the perspective of the sending application, such as information to identify the business document in a message, information about the sender, and (optionally) information about the recipient. The MessageHeader 383008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

PaymentCardPaymentAuthorisation Package

The PaymentCardPaymentAuthorisation package 383010 groups PaymentCardPaymentAuthorisation entity 383012.

PaymentCardPaymentAuthorisation

Authorization is for a payment by payment card given by a clearing house to a payee. The PaymentCardPaymentAuthorisation 383012 not only contains the authorisation for a payment card payment. It also includes data related to the processing, for example, item information of a business transaction document reference may be included.

The PaymentCardPaymentAuthorisation entity contains the elements ID, PaymentCardPaymentAuthorisationRequestorID, PaymentCardPaymentAuthorisationClearingHouseID, AuthorisationResultCode, PaymentCardVerificationResultCode, PaymentCardVerificationValueVerificationResultCode, PaymentCardAddressVerificationResultCode, ProductRecipientPartyPaymentCardAddressVerificationResultCode, PaymentAuthorisationDateTime, AuthorisedPaymentAmount, AuthorisationResultDescription, and AuthorisationExpirationDateTime. The ID is a unique identifier of the payment card payment. It is of type GDT: BusinessTransactionDocumentID. The PaymentCardPaymentAuthorisationRequestorID, which can be optional, is the identifier for an authorization of a card payment that is assigned by the company. It is of type GDT: PaymentCardPaymentAuthorisationPartyID. The PaymentCardPaymentAuthorisationClearingHouseID, which can be optional, is the identifier for an authorization of a card payment that is assigned by the company. It is of type GDT: PaymentCardPaymentAuthorisationPartyID. The AuthorisationResultCode is a result of the success of an authorization at the clearing house. It is of type GDT: AuthorisationResultCode. The PaymentCardVerificationResultCode is a result of the success of a payment card check at the clearing house. It is of type GDT: PaymentCardVerificationResultCode, Qualifier Authorisation. The PaymentCardVerificationValueVerificationResultCode, which can be optional, is the result of the success of a check of a card verification value at the clearing house. It is of type GDT: PaymentCardVerificationValueVerificationResultCode. The PaymentCardAddressVerificationResultCode, which can be optional, is a PaymentCardAddressVerificationResultCode is the coded representation of the verification result of a postal address of a payment card using an address verification system. It is of type GDT: PaymentCardAddressVerificationResultCode. The ProductRecipientPartyPaymentCardAddressVerificationResultCode, which can be optional, is the verification result of a postal address of a payment card using an address verification system, concerning the ProductRecipientParty. It is of type GDT: PaymentCardAddressVerificationResultCode; Qualifier: ProductRecipientParty. The PaymentAuthorisationDateTime is a date on which the authorization check was carried out. It is of type GDT: GLOBAL_DateTime; Qualifier Authorisation. The AuthorisedPaymentAmount, which can be optional, is the payment amount in transaction currency. It is of type GDT: Amount, Qualifier: Payment. The AuthorisationResultDescription, which can be optional, is the result text of the authorization. It is of type GDT: SHORT_Description; Qualifier: AuthorisationResult. The AuthorisationExpirationDateTime, which can be optional, is the expiration date of the authorization. It is of type GDT: GLOBAL_DateTime; Qualifier: Expiration.

Log Package

The Log package 383014 contains Log entity 383016.

Log Entity

The Log 383016 is a sequence of messages that result when an application executes a task. The entity Log is of type GDT: Log.

Message Data Type

The message data type PaymentCardPaymentAuthorisationPreAuthorisationQueryMessage_sync 380006 of FIG. 384 contains entity PaymentCardPaymentAuthorisationPreAuthorisationQueryMessage_sync 384004 and packages MessageHeader 384006 and PaymentCardPaymentAuthorisation 384010.

MessageHeader Package

The MessageHeader 384006 package groups the business information that is relevant for sending a business document in a message. It contains entity MessageHeader 384008.

MessageHeader

The MessageHeader 384008 groups business information from the perspective of the sending application, such as information to identify the business document in a message, information about the sender, and (optionally) information about the recipient. The MessageHeader 384008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

PaymentCardPaymentAuthorisation Package

The PaymentCardPaymentAuthorisation package 384010 groups the PaymentCardPaymentAuthorisation and its packages. It contains the entity PaymentCardPaymentAuthorisation 384012 and the packages Party 384020, Previous Authorisation 384026, and PaymentExplanationItem 384014.

PaymentCardPaymentAuthorisation

Authorization is for a payment by payment card given by a clearing house to a payee. The PaymentCardPaymentAuthorisation 384012 not only contains the authorisation for a payment card payment. It also includes data related to the processing, for example, item information of a business transaction document reference may be included.

The PaymentCardPaymentAuthorisation entity 384012 contains the elements ID, DeviceID, PaymentCardHolderAuthenticationID, PaymentCardHolderAuthenticationResultCode, PaymentCardHolderAuthenticationTokenText, PaymentCardVerificationValueAvailabilityCode, PaymentCardVerificationValueCheckRequiredIndicator, PaymentAmount, PaymentCardVerificationValueText, PaymentCard, PaymentCardChargedBusinessTransactionDocumentBankAccount, and Location. The ID is a unique identifier of the payment card payment. It is of type GDT: BusinessTransactionDocumentID. The DeviceID, which can be optional, is an identifier for an input or output device in computing, such as the IP address. It is of type GDT: DeviceID. The PaymentCardHolderAuthenticationID, which can be optional, is an identifier for a payment card holder authentication. It is of type GDT: PaymentCardHolderAuthenticationID. The PaymentCardHolderAuthenticationResultCode, which can be optional, is the coded representation of the result of a cardholder authentication. It is of type GDT: PaymentCardHolderAuthenticationResultCode. The PaymentCardHolderAuthenticationTokenText, which can be optional, is a value of the result of the PaymentCardHolder authentication check, performed by the Interoperability Domain. It is of type GDT: PaymentCardHolderAuthenticationTokenText. The PaymentCardVerificationValueAvailabilityCode, which can be optional, is information regarding the availability of verification code on a payment card. It is of type GDT: PaymentCardVerificationValueAvailabilityCode. The PaymentCardVerificationValueCheckRequiredIndicator indicates whether or not the CardVerificationValue should be transferred in the authorization message. It is of type GDT: Indicator; Qualifier Required. The PaymentAmount, which can be optional, is the payment amount in transaction currency. It is of type GDT: Amount, Qualifier: Payment. The PaymentCardVerificationValueText, which can be optional, is the verification code of payment cards. It is of type GDT: PaymentCardVerificationValueText. The PaymentCard, which can be optional, is an identification card that authorizes the holder to settle invoices without cash with contract companies connected to the payment system. It is of type GDT: PaymentCard. The PaymentCardChargedBusinessTransactionDocumentBankAccount, which can be optional, is the bank account of the payment card which is charged in payment card payment. It is of type GDT: BusinessTransactionDocumentBankAccount, Qualifier: PaymentCardCharged. The Location, which can be optional, is a place where the transaction took place. It is of type GDT: BusinessTransactionDocumentLocation.

Party Package

The Party package 384020 contains the entities PayerParty 384024 and PayeeParty 384022.

PayeeParty

The PayeeParty 384022 is a party that receives payment for goods or services provided. The PayeeParty 384022, which can be optional, is of type GDT: BusinessTransactionDocumentParty.

PayerParty

The PayerParty 384024 is a party that pays for goods or services. The PayerParty 384024, which can be optional, is of type GDT: BusinessTransactionDocumentParty.

PreviousAuthorisation Package

The PreviousAuthorisation package 384026 contains the entity PreviousAuthorisation 384028.

PreviousAuthorisation

PreviousAuthorisation 384028 contains the elements PaymentCardPaymentAuthorisationRequestorID, PaymentCardPaymentAuthorisationClearingHouseID, PaymentAuthorisationDateTime, and AuthorisationPaymentAmount. The PaymentCardPaymentAuthorisationRequestorID, which can be optional, is an identifier for an authorization of a card payment that is assigned by the company. It is of type GDT: PaymentCardPaymentAuthorisationPartyID; Role Requestor. The PaymentCardPaymentAuthorisationClearingHouseID, which can be optional, is an identifier for an authorization of a card payment that is assigned by a clearing house for card payments. It is of type GDT: PaymentCardPaymentAuthorisationPartyID; Role ClearingHouse. The PaymentAuthorisationDateTime, which can be optional, is a date on which the authorization check was carried out. It is of type GDT: GLOBAL_DateTime; Qualifier Authorisation. The AuthorisationPaymentAmount, which can be optional, is a payment amount in transaction currency. It is of type GDT: Amount, Qualifier: Payment. Typically, at least one of these 4 elements should be filled.

PaymentExplanationItem Package

The PaymentExplanationItem package 384014 contains the entity PaymentExplanationItem 384016 and package Product 384018.

PaymentExplanationItem

The PaymentExplanationItem 384016 is an item that explains a payment card payment for which authorization is requested, in particular, contains product and quantity of a related sales order or invoice. The elements located directly at the PaymentOrderPaymentAuthorisationItem node are BusinessTransactionDocumentReference, CreationDate, and RequestedQuantity. The BusinessTransactionDocumentReference is a unique reference to other business documents or business document items. It is of type GDT: BusinessTransactionDocumentReference. The CreationDate, which can be optional, is the date at which the PaymentOrderPaymentAuthorisationItem was created. It is of type GDT: GLOBAL_DateTime, Qualifier: Creation. The RequestedQuantity, which can be optional, is the quantity which is requested. It is of type GDT: Quantity, Qualifier: Requested.

Product Package

The Product Package 384018 contains the entity Product.

Product

Product includes product specific data of the business transaction. A product is commodity that is the object of the business activity of a company and serves to generate value for this company. It can be tangible or intangible. A product can have relationships to other products or objects. For example, there can be a service for a specially manufactured product. The element located directly at the Product node is the BusinessTransactionDocumentProduct which contains the information that is exchanged in business documents about a product. It is of type GDT: BusinessTransactionDocumentProduct.

Message Data Type

The message data type PaymentCardPaymentAuthorisationPreAuthorisationResponseMessage_sync 380008 of FIG. 385 contains entity PaymentCardPaymentAuthorisationPreAuthorisationResponseMessage_sync 385004 and packages MessageHeader 385006, PaymentCardPaymentAuthorisation 385010, and Log 385014. The message data type PaymentCardPaymentAuthorisationConfirmation_sync Message, therefore, provides the structure for the message type PaymentCardPaymentAuthorisationConfirmation_sync and the interfaces that are based on them.

MessageHeader Package

The MessageHeader 385006 package groups the business information that is relevant for sending a business document in a message. It contains entity MessageHeader 385008.

MessageHeader

The MessageHeader 385008 groups business information from the perspective of the sending application, such as information to identify the business document in a message, information about the sender, and (optionally) information about the recipient. The MessageHeader 385008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

PaymentCardPaymentAuthorisation Package

The PaymentCardPaymentAuthorisation package 385010 groups the PaymentCardPaymentAuthorisation. It contains the entity PaymentCardPaymentAuthorisation 385012.

PaymentCardPaymentAuthorisation

Authorization is for a payment by payment card given by a clearing house to a payee. The PaymentCardPaymentAuthorisation 385012 not only contains the authorisation for a payment card payment. It also includes data related to the processing, e.g., item information of a business transaction document reference may be included.

PaymentCardPaymentAuthorisation entity 385012 contains elements ID, AuthorisationResultCode, PaymentCardVerificationResultCode, PaymentCardVerificationValueVerificationResultCode, PaymentCardAddressVerificationResultCode, ProductRecipientPartyPaymentCardAddressVerificationResultCode, PaymentAuthorisationDateTime, AuthorisedPaymentAmount, AuthorisationResultDescription, and AuthorisationExpirationDateTime. The ID is a unique identifier of the payment card payment. It is of type GDT: BusinessTransactionDocumentID. The AuthorisationResultCode is a result of the success of an authorization at the clearing house. It is of type GDT: AuthorisationResultCode. The PaymentCardVerificationResultCode is a result of the success of a payment card check at the clearing house. It is of type GDT: PaymentCardVerificationResultCode. The PaymentCardVerificationValueVerificationResultCode, which can be optional, is the result of the success of a check of a card verification value at the clearing house. It is of type GDT: PaymentCardVerificationValueVerificationResultCode. The PaymentCardAddressVerificationResultCode, which can be optional, is the coded representation of the verification result of a postal address of a payment card using an address verification system. It is of type GDT: PaymentCardAddressVerificationResultCode. The ProductRecipientPartyPaymentCardAddressVerificationResultCode, which can be optional, is the verification result of a postal address of a payment card using an address verification system, concerning the ProductRecipientParty. It is of type GDT: PaymentCardAddressVerificationResultCode; Qualifier: ProductRecipientParty. The PaymentAuthorisationDateTime is a date on which the authorization check was carried out. It is of type GDT: GLOBAL_DateTime; Qualifier Authorisation). The AuthorisedPaymentAmount, which can be optional, is the payment amount in transaction currency. It is of type GDT: Amount, Qualifier: Payment. The AuthorisationResultDescription, which can be optional, is the result text of the authorization. It is of type GDT: SHORT_Description; Qualifier: AuthorisationResult. The AuthorisationExpirationDateTime, which can be optional, is the expiration date of the authorization. It is of type GDT: GLOBAL_DateTime; Qualifier: Expiration.

Log Package

The Log package 385014 contains Log entity 385016.

Log Entity

The Log 385016 is a sequence of messages that result when an application executes a task. The entity Log is of type GDT: Log.

Message Data Type

The message data type PaymentCardPaymentAuthorisationCancelRequestMessage_sync 380014 of FIG. 382 contains the entity PaymentCardPaymentAuthorisationCancelRequestMessage_sync 382004 and the packages MessageHeader 382006 and PaymentCardPaymentAuthorisation 382010.

MessageHeader Package

The MessageHeader 382006 package groups the business information that is relevant for sending a business document in a message. It contains entity MessageHeader 382008.

MessageHeader

The MessageHeader 382008 groups business information from the perspective of the sending application, such as information to identify the business document in a message, information about the sender, and (optionally) information about the recipient. The MessageHeader 382008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

PaymentCardPaymentAuthorisation Package

The PaymentCardPaymentAuthorisation package 382010 groups the PaymentCardPaymentAuthorisation and its packages. It contains entity PaymentCardPaymentAuthorisation 382012 and packages Party 382020 and PaymentExplanationItem 382014.

PaymentCardPaymentAuthorisation

Authorization is for a payment by payment card given by a clearing house to a payee. The PaymentCardPaymentAuthorisation 382012 not only contains the authorisation for a payment card payment. It also includes data related to the processing, for example, item information of a business transaction document reference may be included.

PaymentCardPaymentAuthorisation entity 382012 contains elements ID, PaymentCardPaymentAuthorisationClearingHouseID, PaymentCardPaymentAuthorisationRequestorID, DeviceID, PaymentCardHolderAuthenticationID, PaymentCardHolderAuthenticationResultCode, PaymentCardHolderAuthenticationTokenText, PaymentCardVerificationValueAvailabilityCode, PaymentCardVerificationValueCheckRequiredIndicator, PaymentAmount, PaymentAuthorisationDateTime, PaymentCardVerificationValueText, PaymentCard, PaymentCardChargedBusinessTransactionDocumentBankAccount, and Location. The ID is a unique identifier of the payment card payment. It is of type GDT: BusinessTransactionDocumentID. The PaymentCardPaymentAuthorisationClearingHouseID, which can be optional, is the identifier for an authorization of a card payment that is assigned by a clearing house or bank for card payments. It is of type GDT: PaymentCardPaymentAuthorisationPartyID. The Payment- CardPaymentAuthorisationRequestorID, which can be optional, is the identifier for an authorization of a card payment that is assigned by the requestor. It is of type GDT: PaymentCardPaymentAuthorisationPartyID. The DeviceID, which can be optional, is the identifier for an input or output device in computing, for example the IP address. It is of type GDT: DeviceID. The PaymentCardHolderAuthenticationID, which can be optional, is the identifier for a payment card holder authentication. It is of type GDT: PaymentCardHolderAuthenticationID. The PaymentCardHolderAuthenticationResultCode, which can be optional, is the coded representation of the result of a cardholder authentication. It is of type GDT: PaymentCardHolderAuthenticationResultCode. The PaymentCardHolderAuthenticationTokenText, which can be optional, is a value of the result of the PaymentCardHolder authentication check, performed by the Interoperability Domain. It is of type GDT: PaymentCardHolderAuthenticationTokenText. The PaymentCardVerificationValueAvailabilityCode, which can be optional, is information regarding the availability of verification code on a payment card. It is of type GDT: PaymentCardVerificationValueAvailabilityCode. The PaymentCardVerificationValueCheckRequiredIndicator indicates whether or not the CardVerificationValue should be transferred in the authorization message (GDT: Indicator; Qualifier Required. The PaymentAmount, which can be optional, is the payment amount in transaction currency. It is of type GDT: Amount, Qualifier: Payment. The PaymentAuthorisationDateTime, which can be optional, is the date on which the authorization check was carried out. It is of type GDT: GLOBAL_DateTime; Qualifier Authorisation. The PaymentCardVerificationValueText, which can be optional, is the PaymentCardVerificationValueText is the verification code of payment cards. It is of type GDT: PaymentCardVerificationValueText. The PaymentCard is an identification card that authorizes the holder to settle invoices without cash with contract companies connected to the payment system. It is of type GDT: PaymentCard. The PaymentCardChargedBusinessTransactionDocumentBankAccount, which can be optional, is the bank account of the payment card which is charged in payment card payment. It is of type GDT: BusinessTransactionDocumentBankAccount, Qualifier: PaymentCardCharged. The Location, which can be optional, is the place where the transaction took place. It is of type GDT: BusinessTransactionDocumentLocation.

Party Package

The Party package 382020 contains the entities PayerParty 382024 and PayeeParty 382022.

PayeeParty

The PayeeParty 382022 is a party that receives payment for goods or services provided. The PayeeParty 382022, which can be optional, is of type GDT: BusinessTransactionDocumentParty.

PayerParty

The PayerParty 382024 is a party that pays for goods or services. The PayerParty 382024, which can be optional, is of type GDT: BusinessTransactionDocumentParty.

PaymentExplanationItem Package

The PaymentExplanationItem package 382014 contains the entity PaymentExplanationItem 382016.

PaymentExplanationItem

The PaymentExplanationItem 382016 is an item that explains a payment card payment for which authorization is requested, in particular, contains product and quantity of a related sales order or invoice. The elements located directly at the PaymentOrderPaymentAuthorisationItem node are BusinessTransactionDocumentReference, CreationDate, and RequestedQuantity. The BusinessTransactionDocumentReference is a unique reference to other business documents or business document items. It is of type GDT: BusinessTransactionDocumentReference. The CreationDate, which can be optional, is the date at which the PaymentOrderPaymentAuthorisationItem was created. It is of type GDT: GLOBAL_DateTime, Qualifier: Creation. The RequestedQuantity, which can be optional, is the quantity which is requested. It is of type GDT: Quantity, Qualifier: Requested.

Message Data Type

The message data type PaymentCardPaymentAuthorisationCancelConfirmationMessage_sync 380016 of FIG. 381 contains entity PaymentCardPaymentAuthorisationCancelConfirmationMessage_sync 381004 and packages MessageHeader 381006 and Log 381010. The message data type PaymentCardPaymentAuthorisationConfirmation_sync Message, therefore, provides the structure for the message type PaymentCardPaymentAuthorisationConfirmation_sync and the interfaces that are based on them.

MessageHeader Package

The MessageHeader 381006 package groups the business information that is relevant for sending a business document in a message. It contains entity MessageHeader 381008.

MessageHeader

The MessageHeader 381008 groups business information from the perspective of the sending application, such as information to identify the business document in a message, information about the sender, and (optionally) information about the recipient. The MessageHeader 381008 contains a SenderParty and a RecipientParty, and is of type GDT: BusinessDocumentMessageHeader.

SenderParty

The SenderParty is the party responsible for sending a business document at business application level. The SenderParty is of type GDT: BusinessDocumentMessageHeaderParty.

RecipientParty

The RecipientParty is the party responsible for receiving a business document at business application level. The RecipientParty is of type GDT: BusinessDocumentMessageHeaderParty.

Log Package

The Log package 381014 contains Log entity 381016.

Log Entity

The Log 381016 is a sequence of messages that result when an application executes a task.

ProductionPlanningOrder SCM Interfaces

Production planners and production schedulers need to be able to get an overview over the production planning orders that are planned for covering internal and external requirements. They also need to know material requirements at the component level and capacity requirements caused by these production planning orders. Within the material requirements planning a production planning order is a request to initiate the in-house production of a particular quantity of a material on a defined date.

Message Choreography

The message choreography of FIG. 452 describes a possible logical sequence of messages that can be used to realize a production planning order business scenario.

The message sent ProductionPlanningOrderCreateRequest_sync is sent from the Production Planner/Production Scheduler to create a Production Planning Order in Supply and Demand Matching. The structure of the message type ProductionPlanningOrderCreateRequest_sync is specified by the message data type ProductionPlanningOrderCreateRequestMessage_sync.

The message ProductionPlanningOrderCreateConfirmation_sync is sent from Supply and Demand Matching to the Production Planner/Production Scheduler to confirm a ProductionPlanningOrderCreateRequest_sync. The structure of the message type ProductionPlanningOrderCreateConfirmation_sync is specified by the message data type ProductionPlanningOrderCreateConfirmationMessage_sync.

The message ProductionPlanningOrderChangeRequest_sync is sent from the Production Planner/Production Scheduler to change a ProductionPlanningOrder in Supply and Demand Matching. The structure of the message type ProductionPlanningOrderChangeRequest_sync is specified by the message data type ProductionPlanningOrderChangeRequestMessage_sync.

The message ProductionPlanningOrderChangeConfirmation_sync is sent from Supply and Demand Matching to the Production Planner/Production Scheduler to confirm a ProductionPlanningOrderChangeRequest_sync. The structure of the message type ProductionPlanningOrderChangeConfirmation_sync is specified by the message data type ProductionPlanningOrderChangeConfirmationMessage_sync.

The message ProductionPlanningOrderCancelRequest_sync is sent from a Production Planner/Production Scheduler to cancel a ProductionPlanningOrder in Supply and Demand Matching. The structure of the message type ProductionPlanningOrderCancelRequest_sync is specified by the message data type ProductionPlanningOrderCancelRequestMessage_sync.

The message ProductionPlanningOrderCancelConfirmation_sync is sent from Supply and Demand Matching to the Production Planner/Production Scheduler to confirm a ProductionPlanningOrderCancelRequest_sync. The structure of the message type ProductionPlanningOrderCancelConfirmation_sync is specified by the message data type ProductionPlanningOrderCancelConfirmationMessage_sync.

The message ProductionPlanningOrderSimpleByElementsQuery_sync is an inquiry to Supply and Demand Matching for ProductionPlanningOrder basic information that satisfies the selection criteria specified in the query. The structure of the message type ProductionPlanningOrderSimpleByElementsQuery_sync is specified by the message data type ProductionPlanningOrderSimpleByElementsQueryMessage_sync.

The message ProductionPlanningOrderSimpleByElementsResponse_sync is a response to ProductionPlanningOrderSimpleByElementsQuery_sync. The structure of the message type ProductionPlanningOrderSimpleByElementsResponse_sync is specified by the message data type ProductionPlanningOrderSimpleByElementsResponseMessage_sync The message ProductionPlanningOrderByIDQuery_sync is an inquiry to Supply and Demand Matching to return complete information for one ProductionPlanningOrder that satisfies the selection criteria specified in the query. The structure of the message type ProductionPlanningOrderByIDQuery_sync is specified by the message data type ProductionPlanningOrderByIDQueryMessage_sync.

The message ProductionPlanningOrderByIDResponse_sync is a response to ProductionPlanningOrderByIDQuery_sync. The structure of the message type ProductionPlanningOrderByIDResponse_sync is specified by the message data type ProductionPlanningOrderByIDResponseMessage_sync.

For example, a "Production Planner/Production Scheduler" system 452002 can request to create a production planning order using the ProductionPlanningOrderCreateRequest_sync message 452006 as shown, for example, in FIG. 460. A "Supply and Demand Matching" system 452004 can confirm the creation request using the ProductionPlanningOrderCreateConfirmation_sync message 452008 as shown, for example, in FIG. 459. The "Production Planner/Production Scheduler" system 452002 can query production planning orders by elements (e.g., by basic data) using the ProductionPlanningOrderSimpleByBasicDataQuery_sync message 452010 as shown, for example, in FIG. 461. The "Supply and Demand Matching" system 452004 can respond to the query using the ProductionPlanningOrderSimpleByBasicDataResponse_sync message 452012 as shown, for example, in FIG. 462. The "Production Planner/Production Scheduler" system 452002 can query production planning orders by ID using the ProductionPlanningOrderByBasicDataQuery_sync message 452014 as shown, for example, in FIG. 453. The "Supply and Demand Matching" system 452004 can respond to the query using the ProductionPlanningOrderByBasicDataResponse_sync message 452016 as shown, for example, in FIG. 454. The "Production Planner/Production Scheduler" system 452002 can request to change a production planning order using the ProductionPlanningOrderChangeRequest_sync message 452018 as shown, for example, in FIG. 458. The "Supply and Demand Matching" system 452004 can confirm the change request using the ProductionPlanningOrderChangeConfirmation_sync message 452020 as shown, for example, in FIG. 457. The "Production Planner/Production Scheduler" system 452002 can request to cancel a production planning order using the ProductionPlanningOrderCancelRequest_sync message 452022 as shown, for example, in FIG. 456. The "Supply and Demand Matching" system 452004 can confirm the cancellation request using the ProductionPlanningOrderCancelConfirmation_sync message 452024 as shown, for example, in FIG. 455.

Message Data Type

The message data type ProductionPlanningOrderCreateRequestMessage_sync contains the ProductionPlanningOrderCreateRequest included in the business document and the business information that is relevant for sending a business document in a message. It contains the MessageHeader and ProductionPlanningOrder packages. FIGS. 464-1 through 464-6 show a ProductionPlanningOrderChangeRequestMessage_sync 464000 package. The ProductionPlanningOrderChangeRequestMessage_sync 464000 package is a ProductionPlanningOrderChangeRequestMessage_sync 464004 datatype. The ProductionPlanningOrderChangeRequestMessage_sync 464000 package includes a ProductionPlanningOrderChangeRequestMessage_sync 464002 entity. The ProductionPlanningOrderChangeRequestMessage_sync 464000 package includes various packages, namely MessageHeader 464006 and ProductionPlanningOrder 464014.

The MessageHeader 464006 package is a BasicBusinessDocumentMessageHeader 464012 datatype. The MessageHeader 464006 package includes a MessageHeader 464008 entity.

The MessageHeader 464008 entity has a cardinality of one 464010 meaning that for each instance of the ProductionPlanningOrderChangeRequestMessage_sync 464002 entity there is one MessageHeader 464008 entity.

The ProductionPlanningOrder 464014 package includes a ProductionPlanningOrder 464016 entity. The ProductionPlanningOrder 464014 package includes a Component 464038 package.

The ProductionPlanningOrder 464016 entity has a cardinality of zero or one 464018 meaning that for each instance of the ProductionPlanningOrderChangeRequestMessage_sync 464002 entity there may be one ProductionPlanningOrder 464016 entity. The ProductionPlanningOrder 464016 entity includes various attributes, namely ID 464020, ProductionModelID 464026 and ConversionAllowedIndicator 464032.

The ID 464020 attribute is a BusinessTransactionDocumentID 464024 datatype. The ID 464020 attribute has a cardinality of one 464022 meaning that for each instance of the ProductionPlanningOrder 464016 entity there is one ID 464020 attribute.

The ProductionModelID 464026 attribute is a ProductionModelID 464030 datatype. The ProductionModelID 464026 attribute has a cardinality of zero or one 464028 meaning that for each instance of the ProductionPlanningOrder 464016 entity there may be one ProductionModelID 464026 attribute.

The ConversionAllowedIndicator 464032 attribute is a ConversionAllowedIndicator 464036 datatype. The ConversionAllowedIndicator 464032 attribute has a cardinality of zero or one 464034 meaning that for each instance of the ProductionPlanningOrder 464016 entity there may be one ConversionAllowedIndicator 464032 attribute.

The Component 464038 package includes various entities, namely MaterialOutput 464040 and MaterialInput 4640108.

The MaterialOutput 464040 entity has a cardinality of one or n 464042 meaning that for each instance of the ProductionPlanningOrder 464016 entity there are one or more MaterialOutput 464040 entities. The MaterialOutput 464040 entity includes various attributes, namely ProductInternalID 464044, ProductionDateTime 464050, AvailabilityDateTime 464056, PlannedQuantity 464062, PlannedQuantityTypeCode 464068, PriorityValue 464074 and FixedIndicator 464080. The MaterialOutput 464040 entity includes a PropertyValuation 464086 subordinate entity.

The ProductInternalID 464044 attribute is a ProductInternalID 464048 datatype. The ProductInternalID 464044 attribute has a cardinality of one 464046 meaning that for each instance of the MaterialOutput 464040 entity there is one ProductInternalID 464044 attribute.

The ProductionDateTime 464050 attribute is a ProductionLOCALNORMALISED_DateTime 464054 datatype. The ProductionDateTime 464050 attribute has a cardinality of zero or one 464052 meaning that for each instance of the MaterialOutput 464040 entity there may be one ProductionDateTime 464050 attribute.

The AvailabilityDateTime 464056 attribute is an AvailabilityLOCALNORMALISED_DateTime 464060 datatype. The AvailabilityDateTime 464056 attribute has a cardinality of one 464058 meaning that for each instance of the MaterialOutput 464040 entity there is one AvailabilityDateTime 464056 attribute.

The PlannedQuantity 464062 attribute is a LARGEQuantity 464066 datatype. The PlannedQuantity 464062 attribute has a cardinality of one 464064 meaning that for each instance of the MaterialOutput 464040 entity there is one PlannedQuantity 464062 attribute.

The PlannedQuantityTypeCode 464068 attribute is a QuantityTypeCode 464072 datatype. The PlannedQuantityTypeCode 464068 attribute has a cardinality of zero or one 464070 meaning that for each instance of the MaterialOutput 464040 entity there may be one PlannedQuantityTypeCode 464068 attribute.

The PriorityValue 464074 attribute is a PriorityValue 464078 datatype. The PriorityValue 464074 attribute has a cardinality of one 464076 meaning that for each instance of the MaterialOutput 464040 entity there is one PriorityValue 464074 attribute.

The FixedIndicator 464080 attribute is a FixedIndicator 464084 datatype. The FixedIndicator 464080 attribute has a cardinality of one 464082 meaning that for each instance of the MaterialOutput 464040 entity there is one FixedIndicator 464080 attribute.

The PropertyValuation 464086 entity has a cardinality of zero or n 464088 meaning that for each instance of the MaterialOutput 464040 entity there may be one or more PropertyValuation 464086 entities. The PropertyValuation 464086 entity includes various attributes, namely PropertyID 464090, PropertyValue 464096 and PropertyName 4640102.

The PropertyID 464090 attribute is a PropertyID 464094 datatype. The PropertyID 464090 attribute has a cardinality of one 464092 meaning that for each instance of the PropertyValuation 464086 entity there is one PropertyID 464090 attribute.

The PropertyValue 464096 attribute is a PropertyValue 4640100 datatype. The PropertyValue 464096 attribute has a cardinality of one 464098 meaning that for each instance of the PropertyValuation 464086 entity there is one PropertyValue 464096 attribute.

The PropertyName 4640102 attribute is a PropertyValueMEDIUM_Name 4640106 datatype. The PropertyName 4640102 attribute has a cardinality of zero or one 4640104 meaning that for each instance of the PropertyValuation 464086 entity there may be one PropertyName 4640102 attribute.

The MaterialInput 4640108 entity has a cardinality of zero or n 4640110 meaning that for each instance of the ProductionPlanningOrder 464016 entity there may be one or more MaterialInput 4640108 entities. The MaterialInput 4640108 entity includes various attributes, namely ItemID 4640112, ProductInternalID 4640118, DueDateTime 4640124, PlannedQuantity 4640130 and PlannedQuantityTypeCode 4640136. The MaterialInput 4640108 entity includes a PropertyValuation 4640142 subordinate entity.

The ItemID 4640112 attribute is a BusinessTransactionDocumentID 4640116 datatype. The ItemID 4640112 attribute has a cardinality of one 4640114 meaning that for each instance of the MaterialInput 4640108 entity there is one ItemID 4640112 attribute.

The ProductInternalID 4640118 attribute is a ProductInternalID 4640122 datatype. The ProductInternalID 4640118 attribute has a cardinality of one 4640120 meaning that for each instance of the MaterialInput 4640108 entity there is one ProductInternalID 4640118 attribute.

The DueDateTime 4640124 attribute is a DueLOCALNORMALISED_DateTime 4640128 datatype. The DueDateTime 4640124 attribute has a cardinality of zero or one 4640126 meaning that for each instance of the MaterialInput 4640108 entity there may be one DueDateTime 4640124 attribute.

The PlannedQuantity 4640130 attribute is a PlannedLARGEQuantity 4640134 datatype. The PlannedQuantity 4640130 attribute has a cardinality of one 4640132 meaning that for each instance of the MaterialInput 4640108 entity there is one PlannedQuantity 4640130 attribute.

The PlannedQuantityTypeCode 4640136 attribute is a PlannedQuantityTypeCode 4640140 datatype. The PlannedQuantityTypeCode 4640136 attribute has a cardinality of zero or one 4640138 meaning that for each instance of the MaterialInput 4640108 entity there may be one PlannedQuantityTypeCode 4640136 attribute.

The PropertyValuation 4640142 entity has a cardinality of zero or n 4640144 meaning that for each instance of the MaterialInput 4640108 entity there may be one or more PropertyValuation 4640142 entities. The PropertyValuation 4640142 entity includes various attributes, namely PropertyID 4640146, PropertyValue 4640152 and PropertyValueName 4640158.

The PropertyID 4640146 attribute is a PropertyID 4640150 datatype. The PropertyID 4640146 attribute has a cardinality of one 4640148 meaning that for each instance of the PropertyValuation 4640142 entity there is one PropertyID 4640146 attribute.

The PropertyValue 4640152 attribute is a PropertyValue 4640156 datatype. The PropertyValue 4640152 attribute has a cardinality of one 4640154 meaning that for each instance of the PropertyValuation 4640142 entity there is one PropertyValue 4640152 attribute.

The PropertyValueName 4640158 attribute is a PropertyValueMEDIUM_Name 4640162 datatype. The PropertyValueName 4640158 attribute has a cardinality of zero or one 4640160 meaning that for each instance of the PropertyValuation 4640142 entity there may be one PropertyValueName 4640158 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder package groups the information relevant to describe a ProductionPlanningOrder. It contains the ProductionPlanningOrder entity. It contains the Component package.

ProductionPlanningOrder

Within the material requirements planning a ProductionPlanningOrder is a request to initiate the in-house production of a particular quantity of a material on a defined date. ID is an identifier for a production planning order. PlanningVersionID is a unique identifier for a Planning Version containing all necessary master and transaction data for planning. SupplyPlanningAreaID is a unique identifier of a SupplyPlanningArea for which the ProductionPlanningOrder is planned. LogisticsPlanningDetailLevelCode specifies the level of detail of planning.

Component Package

The Component package contains the MaterialOutput and PropertyValuation entities.

MaterialOutput

A MaterialOutput represents a material which is planned to be produced. ProductInternalID is a proprietary identifier for the MaterialOutput. SupplyPlanningAreaID is a unique identifier of a SupplyPlanningArea for which a stock receipt is planned via the production of the MaterialOutput. ProductionDateTime is a date/time on which production of the material output is planned to take place. AvailabilityDateTime is a date/time on which the material output should be available. PlannedQuantity is a planned quantity of the material output. PlannedQuantityTypeCode is a coded representation of the type of the planned quantity of the material output.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

Message Data Type

The message data type ProductionPlanningOrderCreateConfirmationMessage_sync contains the ProductionPlanningOrderCreateConfirmation included in the business document and the business information that is relevant for sending a business document in a message. It contains MessageHeader, ProductionPlanningOrder and Log packages. FIG. 469 shows a ProductionPlanningOrderCreateConfirmationMessage_sync 469000 package. The ProductionPlanningOrderCreateConfirmationMessage_sync 469000 package is a ProductionPlanningOrderCreateConfirmationMessage_sync 469004 datatype. The ProductionPlanningOrderCreateConfirmationMessage_sync 469000 package includes a ProductionPlanningOrderCreateConfirmationMessage_sync 469002 entity. The ProductionPlanningOrderCreateConfirmationMessage_sync 469000 package includes various packages, namely MessageHeader 469006, ProductionPlanningOrder 469014 and Log 469026.

The MessageHeader 469006 package is a BasicBusinessDocumentMessageHeader 469012 datatype. The MessageHeader 469006 package includes a MessageHeader 469008 entity.

The MessageHeader 469008 entity has a cardinality of one 469010 meaning that for each instance of the ProductionPlanningOrderCreateConfirmationMessage_sync 469002 entity there is one MessageHeader 469008 entity.

The ProductionPlanningOrder 469014 package includes a ProductionPlanningOrder 469016 entity.

The ProductionPlanningOrder 469016 entity has a cardinality of zero or one 469018 meaning that for each instance of the ProductionPlanningOrderCreateConfirmationMessage_sync 469002 entity there may be one ProductionPlanningOrder 469016 entity. The ProductionPlanningOrder 469016 entity includes an ID 469020 attribute.

The ID 469020 attribute is a BusinessTransactionDocumentID 469024 datatype. The ID 469020 attribute has a cardinality of one 469022 meaning that for each instance of the ProductionPlanningOrder 469016 entity there is one ID 469020 attribute.

The Log 469026 package is a Log 469032 datatype. The Log 469026 package includes a Log 469028 entity.

The Log 469028 entity has a cardinality of one 469030 meaning that for each instance of the ProductionPlanningOrderCreateConfirmationMessage_sync 469002 entity there is one Log 469028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder

The ProductionPlanningOrder contains the following element. ID is an identifier for a production planning order.

Log Package

Log

A log is a sequence of messages that may result from the execution of an application task.

Message Data Type

The message data type ProductionPlanningOrderChangeRequestMessage_sync contains the ProductionPlanningOrderChangeRequest included in the business document and the business information that is relevant for sending a business document in a message. It contains the MessageHeader and ProductionPlanningOrder packages. FIGS. 470-1 through 470-4 show a ProductionPlanningOrderCreateRequestMessage_sync 470000 package. The ProductionPlanningOrderCreateRequestMessage_sync 470000 package is a ProductionPlanningOrderCreateRequestMessage_sync 470004 datatype. The ProductionPlanningOrderCreateRequestMessage_sync 470000 package includes a ProductionPlanningOrderCreateRequestMessage_sync 470002 entity. The ProductionPlanningOrderCreateRequestMessage_sync 470000 package includes various packages, namely MessageHeader 470006 and ProductionPlanningOrder 470014.

The MessageHeader 470006 package is a BasicBusinessDocumentMessageHeader 470012 datatype. The MessageHeader 470006 package includes a MessageHeader 470008 entity.

The MessageHeader 470008 entity has a cardinality of one 470010 meaning that for each instance of the ProductionPlanningOrderCreateRequestMessage_sync 470002 entity there is one MessageHeader 470008 entity.

The ProductionPlanningOrder 470014 package includes a ProductionPlanningOrder 470016 entity. The ProductionPlanningOrder 470014 package includes a Component 470044 package.

The ProductionPlanningOrder 470016 entity has a cardinality of one 470018 meaning that for each instance of the ProductionPlanningOrderCreateRequestMessage_sync 470002 entity there is one ProductionPlanningOrder 470016 entity. The ProductionPlanningOrder 470016 entity includes various attributes, namely ID 470020, PlanningVersionID 470026, SupplyPlanningAreaID 470032 and LogisticsPlanningDetailLevelCode 470038.

The ID 470020 attribute is a BusinessTransactionDocumentID 470024 datatype. The ID 470020 attribute has a cardinality of zero or one 470022 meaning that for each instance of the ProductionPlanningOrder 470016 entity there may be one ID 470020 attribute.

The PlanningVersionID 470026 attribute is a PlanningVersionID 470030 datatype. The PlanningVersionID 470026 attribute has a cardinality of one 470028 meaning that for each instance of the ProductionPlanningOrder 470016 entity there is one PlanningVersionID 470026 attribute.

The SupplyPlanningAreaID 470032 attribute is a SupplyPlanningAreaID 470036 datatype. The SupplyPlanningAreaID 470032 attribute has a cardinality of one 470034 meaning that for each instance of the ProductionPlanningOrder 470016 entity there is one SupplyPlanningAreaID 470032 attribute.

The LogisticsPlanningDetailLevelCode 470038 attribute is a LogisticsPlanningDetailLevelCode 470042 datatype. The LogisticsPlanningDetailLevelCode 470038 attribute has a cardinality of zero or one 470040 meaning that for each instance of the ProductionPlanningOrder 470016 entity there may be one LogisticsPlanningDetailLevelCode 470038 attribute.

The Component 470044 package includes a MaterialOutput 470046 entity.

The MaterialOutput 470046 entity has a cardinality of one or n 470048 meaning that for each instance of the ProductionPlanningOrder 470016 entity there are one or more MaterialOutput 470046 entities. The MaterialOutput 470046 entity includes various attributes, namely ProductInternalID 470050, SupplyPlanningAreaID 470056, ProductionDateTime 470062, AvailabilityDateTime 470068, PlannedQuantity 470074 and PlannedQuantityTypeCode 470080. The MaterialOutput 470046 entity includes a PropertyValuation 470086 subordinate entity.

The ProductInternalID 470050 attribute is a ProductInternalID 470054 datatype. The ProductInternalID 470050 attribute has a cardinality of one 470052 meaning that for each instance of the MaterialOutput 470046 entity there is one ProductInternalID 470050 attribute.

The SupplyPlanningAreaID 470056 attribute is a SupplyPlanningAreaID 470060 datatype. The SupplyPlanningAreaID 470056 attribute has a cardinality of one 470058 meaning that for each instance of the MaterialOutput 470046 entity there is one SupplyPlanningAreaID 470056 attribute.

The ProductionDateTime 470062 attribute is a ProductionLOCALNORMALISED_DateTime 470066 datatype. The ProductionDateTime 470062 attribute has a cardinality of zero or one 470064 meaning that for each instance of the MaterialOutput 470046 entity there may be one ProductionDateTime 470062 attribute.

The AvailabilityDateTime 470068 attribute is an AvailabilityLOCALNORMALISED_DateTime 470072 datatype. The AvailabilityDateTime 470068 attribute has a cardinality of one 470070 meaning that for each instance of the MaterialOutput 470046 entity there is one AvailabilityDateTime 470068 attribute.

The PlannedQuantity 470074 attribute is a LARGEQuantity 470078 datatype. The PlannedQuantity 470074 attribute has a cardinality of one 470076 meaning that for each instance of the MaterialOutput 470046 entity there is one PlannedQuantity 470074 attribute.

The PlannedQuantityTypeCode 470080 attribute is a QuantityTypeCode 470084 datatype. The PlannedQuantityTypeCode 470080 attribute has a cardinality of zero or one 470082 meaning that for each instance of the MaterialOutput 470046 entity there may be one PlannedQuantityTypeCode 470080 attribute.

The PropertyValuation 470086 entity has a cardinality of zero or n 470088 meaning that for each instance of the MaterialOutput 470046 entity there may be one or more PropertyValuation 470086 entities. The PropertyValuation 470086 entity includes various attributes, namely PropertyID 470090, PropertyValue 470096 and PropertyName 4700102.

The PropertyID 470090 attribute is a PropertyID 470094 datatype. The PropertyID 470090 attribute has a cardinality of one 470092 meaning that for each instance of the PropertyValuation 470086 entity there is one PropertyID 470090 attribute.

The PropertyValue 470096 attribute is a PropertyValue 4700100 datatype. The PropertyValue 470096 attribute has a cardinality of one 470098 meaning that for each instance of the PropertyValuation 470086 entity there is one PropertyValue 470096 attribute.

The PropertyName 4700102 attribute is a PropertyValueMEDIUM_Name 4700106 datatype. The PropertyName 4700102 attribute has a cardinality of zero or one 4700104 meaning that for each instance of the PropertyValuation 470086 entity there may be one PropertyName 4700102 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

The ProductionPlanningOrder package groups the information relevant to describe a ProductionPlanningOrder. It contains the ProductionPlanningOrder entity. It contains the Component package.

ProductionPlanningOrder

Within the material requirements planning a ProductionPlanningOrder is a request to initiate the in-house production of a particular quantity of a material on a defined date. ID is an identifier for a production planning order. ProductionModelID is a unique identifier for a ProductionModel containing the production process for manufacturing the MaterialOutput. ConversionAllowedIndicator specifies that the ProductionPlanningOrder can be converted into ProductionOrder during the next planning run.

Component Package

Component package contains the MaterialOutput, PropertyValuation, MaterialInput, and PropertyValuation entities.

MaterialOutput

MaterialOutput represents a material which is planned to be produced. ProductInternalID is a proprietary identifier for the MaterialOutput. ProductInternalID is read-only. ProductionDateTime is a date/time on which production of the material output is planned to take place. AvailabilityDateTime is a date/time on which the material output should be available. PlannedQuantity is a planned quantity of the material output. PlannedQuantityTypeCode is a coded representation of the type of the planned quantity of the material output. PriorityValue is a representation of the priority of the MaterialOutput. FixedIndicator specifies whether the material output is fixed or not.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

MaterialInput

A MaterialInput represents a material which is needed for producing the output materials. ItemID is a position of a MaterialInput within the ProductionPlanningOrder. ProductInternalID is a proprietary Identifier for the MaterialInput. DueDateTime is a point in time at which the material input in due. PlannedQuantity is a planned quantity of the material input. PlannedQuantityTypeCode is a coded representation of the type of the planned quantity of the material input.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

Message Data Type

The message data type ProductionPlanningOrderChangeConfirmationMessage_sync contains the ProductionPlanningOrderChangeConfirmation included in the business document and the business information that is relevant for sending a business document in a message. It contains the MessageHeader, ProductionPlanningOrder and Log packages. FIG. 468 shows a ProductionPlanningOrderChangeConfirmationMessage_sync 468000 package. The ProductionPlanningOrderChangeConfirmationMessage_sync 468000 package is a ProductionPlanningOrderChangeConfirmationMessage_sync 468004 datatype. The ProductionPlanningOrderChangeConfirmationMessage_sync 468000 package includes a ProductionPlanningOrderCreateConfirmationMessage_sync 468002 entity. The ProductionPlanningOrderChangeConfirmationMessage_sync 468000 package includes various packages, namely MessageHeader 468006, ProductionPlanningOrder 468014 and Log 468026.

The MessageHeader 468006 package is a BasicBusinessDocumentMessageHeader 468012 datatype. The MessageHeader 468006 package includes a MessageHeader 468008 entity.

The MessageHeader 468008 entity has a cardinality of one 468010 meaning that for each instance of the ProductionPlanningOrderCreateConfirmationMessage_sync 468002 entity there is one MessageHeader 468008 entity.

The ProductionPlanningOrder 468014 package includes a ProductionPlanningOrder 468016 entity.

The ProductionPlanningOrder 468016 entity has a cardinality of zero or one 468018 meaning that for each instance of the ProductionPlanningOrderCreateConfirmationMessage_sync 468002 entity there may be one ProductionPlanningOrder 468016 entity. The ProductionPlanningOrder 468016 entity includes an ID 468020 attribute.

The ID 468020 attribute is a BusinessTransactionDocumentID 468024 datatype. The ID 468020 attribute has a cardinality of one 468022 meaning that for each instance of the ProductionPlanningOrder 468016 entity there is one ID 468020 attribute.

The Log 468026 package is a Log 468032 datatype. The Log 468026 package includes a Log 468028 entity.

The Log 468028 entity has a cardinality of one 468030 meaning that for each instance of the ProductionPlanningOrderCreateConfirmationMessage_sync 468002 entity there is one Log 468028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains an ID element, which is an identifier for a production planning order.

Log Package

A log is a sequence of messages that may result from the execution of an application task.

Message Data Type

The message data type ProductionPlanningOrderCancelRequestMessage_sync contains the ProductionPlanningOrderCancelRequest included in the business document and the business information that is relevant for sending a business document in a message. It contains the MessageHeader and ProductionPlanningOrder packages. FIG. 467 shows a ProductionPlanningOrderCancelRequestMessage_sync 467000 package. The ProductionPlanningOrderCancelRequestMessage_sync 467000 package is a ProductionPlanningOrderCancelRequestMessage_sync 467004 datatype. The ProductionPlanningOrderCancelRequestMessage_sync 467000 package includes a ProductionPlanningOrderCancelRequestMessage_sync 467002 entity. The ProductionPlanningOrderCancelRequestMessage_sync 467000 package includes various packages, namely MessageHeader 467006 and ProductionPlanningOrder 467014.

The MessageHeader 467006 package is a BasicBusinessDocumentMessageHeader 467012 datatype. The MessageHeader 467006 package includes a MessageHeader 467008 entity.

The MessageHeader 467008 entity has a cardinality of one 467010 meaning that for each instance of the ProductionPlanningOrderCancelRequestMessage_sync 467002 entity there is one MessageHeader 467008 entity.

The ProductionPlanningOrder 467014 package includes a ProductionPlanningOrder 467016 entity.

The ProductionPlanningOrder 467016 entity has a cardinality of one 467018 meaning that for each instance of the ProductionPlanningOrderCancelRequestMessage_sync 467002 entity there is one ProductionPlanningOrder 467016 entity. The ProductionPlanningOrder 467016 entity includes an ID 467020 attribute.

The ID 467020 attribute is a BusinessTransactionDocumentID 467024 datatype. The ID 467020 attribute has a cardinality of one 467022 meaning that for each instance of the ProductionPlanningOrder 467016 entity there is one ID 467020 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains an ID element, which is an identifier for a production planning order.

Message Data Type

The message data type ProductionPlanningOrderCancelConfirmationMessage_sync contains the ProductionPlanningOrderCancelConfirmation included in the business document and the business information that is relevant for sending a business document in a message. It contains the MessageHeader, ProductionPlanningOrder and Log packages. FIG. 466 shows a ProductionPlanningOrderCancelConfirmationMessage_sync 466000 package. The ProductionPlanningOrderCancelConfirmationMessage_sync 466000 package is a ProductionPlanningOrderCancelConfirmationMessage_sync 466004 datatype. The ProductionPlanningOrderCancelConfirmationMessage_sync 466000 package includes a ProductionPlanningOrderCancelConfirmationMessage_sync 466002 entity. The ProductionPlanningOrderCancelConfirmationMessage_sync 466000 package includes various packages, namely MessageHeader 466006, ProductionPlanningOrder 466014 and Log 466026.

The MessageHeader 466006 package is a BasicBusinessDocumentMessageHeader 466012 datatype. The MessageHeader 466006 package includes a MessageHeader 466008 entity.

The MessageHeader 466008 entity has a cardinality of one 466010 meaning that for each instance of the ProductionPlanningOrderCancelConfirmationMessage_sync 466002 entity there is one MessageHeader 466008 entity.

The ProductionPlanningOrder 466014 package includes a ProductionPlanningOrder 466016 entity.

The ProductionPlanningOrder 466016 entity has a cardinality of zero or one 466018 meaning that for each instance of the ProductionPlanningOrderCancelConfirmationMessage_sync 466002 entity there may be one ProductionPlanningOrder 466016 entity. The ProductionPlanningOrder 466016 entity includes an ID 466020 attribute.

The ID 466020 attribute is a BusinessTransactionDocumentID 466024 datatype. The ID 466020 attribute has a cardinality of one 466022 meaning that for each instance of the ProductionPlanningOrder 466016 entity there is one ID 466020 attribute.

The Log 466026 package is a Log 466032 datatype. The Log 466026 package includes a Log 466028 entity.

The Log 466028 entity has a cardinality of one 466030 meaning that for each instance of the ProductionPlanningOrderCancelConfirmationMessage_sync 466002 entity there is one Log 466028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains the ID element, which is an identifier for a production planning order.

Log Package

A log is a sequence of messages that may result from the execution of an application task.

Message Data Type

The message data type ProductionPlanningOrderSimpleByElementsQueryMessage_sync contains the ProductionPlanningOrderSimpleByElementsQuery included in the business document and the business information that is relevant for sending a business document in a message. It contains the Selection package. FIGS. 471-1 through 471-6 show a Production PlanningOrderSimpleByElementsQueryMessage_sync 471000 package. The Production PlanningOrderSimpleByElementsQueryMessage_sync 471000 package is a Production PlanningOrderSimpleByElementsQueryMessage_sync 471004 datatype. The Production PlanningOrderSimpleByElementsQueryMessage_sync 471000 package includes a Production PlanningOrderSimpleByElementsQueryMessage_sync 471002 entity. The Production- PlanningOrderSimpleByElementsQueryMessage_sync 471000 package includes a Selection 471006 package.

The Selection 471006 package includes a ProductionPlanningOrderSelectionSimpleByElements 471008 entity.

The ProductionPlanningOrderSelectionSimpleByElements 471008 entity has a cardinality of one 471010 meaning that for each instance of the ProductionPlanningOrderSimpleByElementsQueryMessage_sync 471002 entity there is one ProductionPlanningOrderSelectionSimpleByElements 471008 entity. The ProductionPlanningOrderSelectionSimpleByElements 471008 entity includes a PlanningVersionID 471012 attribute. The ProductionPlanningOrderSelectionSimpleByElements 471008 entity has various subordinate entities, namely SelectionByProductionPlanningOrderTypeCode 471018, SelectionBySupplyPlanningAreaID 471046, SelectionByProductInternalID 471074, SelectionByResourceID 4710102 and SelectionByAvailabilityDateTime 4710130.

The PlanningVersionID 471012 attribute is a PlanningVersionID 471016 datatype. The PlanningVersionID 471012 attribute has a cardinality of one 471014 meaning that for each instance of the ProductionPlanningOrderSelectionSimpleByElements 471008 entity there is one PlanningVersionID 471012 attribute.

The SelectionByProductionPlanningOrderTypeCode 471018 entity has a cardinality of one 471020 meaning that for each instance of the ProductionPlanningOrderSelectionSimpleByElements 471008 entity there is one SelectionByProductionPlanningOrderTypeCode 471018 entity. The SelectionByProductionPlanningOrderTypeCode 471018 entity includes various attributes, namely InclusionExclusionCode 471022, IntervalBoundaryTypeCode 471028, LowerBoundaryProductionPlanningOrderTypeCode 471034 and UpperBoundaryProductionPlanningOrderTypeCode 471040.

The InclusionExclusionCode 471022 attribute is an InclusionExclusionCode 471026 datatype. The InclusionExclusionCode 471022 attribute has a cardinality of one 471024 meaning that for each instance of the SelectionByProductionPlanningOrderTypeCode 471018 entity there is one InclusionExclusionCode 471022 attribute.

The IntervalBoundaryTypeCode 471028 attribute is an IntervalBoundaryTypeCode 471032 datatype. The IntervalBoundaryTypeCode 471028 attribute has a cardinality of one 471030 meaning that for each instance of the SelectionByProductionPlanningOrderTypeCode 471018 entity there is one IntervalBoundaryTypeCode 471028 attribute.

The LowerBoundaryProductionPlanningOrderTypeCode 471034 attribute is a BusinessTransactionDocumentTypeCode 471038 datatype. The LowerBoundaryProductionPlanningOrderTypeCode 471034 attribute has a cardinality of one 471036 meaning that for each instance of the SelectionByProductionPlanningOrderTypeCode 471018 entity there is one LowerBoundaryProductionPlanningOrderTypeCode 471034 attribute.

The UpperBoundaryProductionPlanningOrderTypeCode 471040 attribute is a BusinessTransactionDocumentTypeCode 471044 datatype. The UpperBoundaryProductionPlanningOrderTypeCode 471040 attribute has a cardinality of zero or one 471042 meaning that for each instance of the SelectionByProductionPlanningOrderTypeCode 471018 entity there may be one UpperBoundaryProductionPlanningOrderTypeCode 471040 attribute.

The SelectionBySupplyPlanningAreaID 471046 entity has a cardinality of zero or one 471048 meaning that for each instance of the ProductionPlanningOrderSelectionSimpleByElements 471008 entity there may be one SelectionBySupplyPlanningAreaID 471046 entity. The SelectionBySupplyPlanningAreaID 471046 entity includes various attributes, namely InclusionExclusionCode 471050, IntervalBoundaryTypeCode 471056, LowerBoundarySupplyPlanningAreaID 471062 and UpperBoundarySupplyPlanningAreaID 471068.

The InclusionExclusionCode 471050 attribute is an InclusionExclusionCode 471054 datatype. The InclusionExclusionCode 471050 attribute has a cardinality of one 471052 meaning that for each instance of the SelectionBySupplyPlanningAreaID 471046 entity there is one InclusionExclusionCode 471050 attribute.

The IntervalBoundaryTypeCode 471056 attribute is an IntervalBoundaryTypeCode 471060 datatype. The IntervalBoundaryTypeCode 471056 attribute has a cardinality of one 471058 meaning that for each instance of the SelectionBySupplyPlanningAreaID 471046 entity there is one IntervalBoundaryTypeCode 471056 attribute.

The LowerBoundarySupplyPlanningAreaID 471062 attribute is a SupplyPlanningAreaID 471066 datatype. The LowerBoundarySupplyPlanningAreaID 471062 attribute has a cardinality of one 471064 meaning that for each instance of the SelectionBySupplyPlanningAreaID 471046 entity there is one LowerBoundarySupplyPlanningAreaID 471062 attribute.

The UpperBoundarySupplyPlanningAreaID 471068 attribute is a SupplyPlanningAreaID 471072 datatype. The UpperBoundarySupplyPlanningAreaID 471068 attribute has a cardinality of zero or one 471070 meaning that for each instance of the SelectionBySupplyPlanningAreaID 471046 entity there may be one UpperBoundarySupplyPlanningAreaID 471068 attribute.

The SelectionByProductInternalID 471074 entity has a cardinality of zero or one 471076 meaning that for each instance of the ProductionPlanningOrderSelectionSimpleByElements 471008 entity there may be one SelectionByProductInternalID 471074 entity. The SelectionByProductInternalID 471074 entity includes various attributes, namely InclusionExclusionCode 471078, IntervalBoundaryTypeCode 471084, LowerBoundaryProductInternalID 471090 and UpperBoundaryProductInternalID 471096.

The InclusionExclusionCode 471078 attribute is an InclusionExclusionCode 471082 datatype. The InclusionExclusionCode 471078 attribute has a cardinality of one 471080 meaning that for each instance of the SelectionByProductInternalID 471074 entity there is one InclusionExclusionCode 471078 attribute.

The IntervalBoundaryTypeCode 471084 attribute is an IntervalBoundaryTypeCode 471088 datatype. The IntervalBoundaryTypeCode 471084 attribute has a cardinality of one 471086 meaning that for each instance of the SelectionByProductInternalID 471074 entity there is one IntervalBoundaryTypeCode 471084 attribute.

The LowerBoundaryProductInternalID 471090 attribute is a ProductInternalID 471094 datatype. The LowerBoundaryProductInternalID 471090 attribute has a cardinality of one 471092 meaning that for each instance of the SelectionByProductInternalID 471074 entity there is one LowerBoundaryProductInternalID 471090 attribute.

The UpperBoundaryProductInternalID 471096 attribute is a ProductInternalID 4710100 datatype. The UpperBoundaryProductInternalID 471096 attribute has a cardinality of zero or one 471098 meaning that for each instance of the SelectionByProductInternalID 471074 entity there may be one UpperBoundaryProductInternalID 471096 attribute.

The SelectionByResourceID 4710102 entity has a cardinality of zero or one 4710104 meaning that for each instance of the ProductionPlanningOrderSelectionSimpleByElements 471008 entity there may be one SelectionByResourceID 4710102 entity. The SelectionByResourceID 4710102 entity includes various attributes, namely InclusionExclusionCode 4710106, IntervalBoundaryTypeCode 4710112, LowerBoundaryResourceID 4710118 and UpperBoundaryResourceID 4710124.

The InclusionExclusionCode 4710106 attribute is an InclusionExclusionCode 4710110 datatype. The InclusionExclusionCode 4710106 attribute has a cardinality of one 4710108 meaning that for each instance of the SelectionByResourceID 4710102 entity there is one InclusionExclusionCode 4710106 attribute.

The IntervalBoundaryTypeCode 4710112 attribute is an IntervalBoundaryTypeCode 4710116 datatype. The IntervalBoundaryTypeCode 4710112 attribute has a cardinality of one 4710114 meaning that for each instance of the SelectionByResourceID 4710102 entity there is one IntervalBoundaryTypeCode 4710112 attribute.

The LowerBoundaryResourceID 4710118 attribute is a ResourceID 4710122 datatype. The LowerBoundaryResourceID 4710118 attribute has a cardinality of one 4710120 meaning that for each instance of the SelectionByResourceID 4710102 entity there is one LowerBoundaryResourceID 4710118 attribute.

The UpperBoundaryResourceID 4710124 attribute is a ResourceID 4710128 datatype. The UpperBoundaryResourceID 4710124 attribute has a cardinality of zero or one 4710126 meaning that for each instance of the SelectionByResourceID 4710102 entity there may be one UpperBoundaryResourceID 4710124 attribute.

The SelectionByAvailabilityDateTime 4710130 entity has a cardinality of zero or one 4710132 meaning that for each instance of the ProductionPlanningOrderSelectionSimpleByElements 471008 entity there may be one SelectionByAvailabilityDateTime 4710130 entity. The SelectionByAvailabilityDateTime 4710130 entity includes various attributes, namely InclusionExclusionCode 4710134, IntervalBoundaryTypeCode 4710140, LowerBoundaryAvailabilityDateTime 4710146 and UpperBoundaryAvailabilityDateTime 4710152.

The InclusionExclusionCode 4710134 attribute is an InclusionExclusionCode 4710138 datatype. The InclusionExclusionCode 4710134 attribute has a cardinality of one 4710136 meaning that for each instance of the SelectionByAvailabilityDateTime 4710130 entity there is one InclusionExclusionCode 4710134 attribute.

The IntervalBoundaryTypeCode 4710140 attribute is an IntervalBoundaryTypeCode 4710144 datatype. The IntervalBoundaryTypeCode 4710140 attribute has a cardinality of one 4710142 meaning that for each instance of the SelectionByAvailabilityDateTime 4710130 entity there is one IntervalBoundaryTypeCode 4710140 attribute.

The LowerBoundaryAvailabilityDateTime 4710146 attribute is an AvailabilityLOCALNORMALISED_DateTime 4710150 datatype. The LowerBoundaryAvailabilityDateTime 4710146 attribute has a cardinality of one 4710148 meaning that for each instance of the SelectionByAvailabilityDateTime 4710130 entity there is one LowerBoundaryAvailabilityDateTime 4710146 attribute.

The UpperBoundaryAvailabilityDateTime 4710152 attribute is an AvailabilityLOCALNORMALISED_DateTime 4710156 datatype. The UpperBoundaryAvailabilityDateTime 4710152 attribute has a cardinality of one 4710154 meaning that for each instance of the SelectionByAvailabilityDateTime 4710130 entity there is one UpperBoundaryAvailabilityDateTime 4710152 attribute.

Selection Package

ProductionPlanningOrderSelectionSimpleByElements

The ProductionPlanningOrderSelectionSimpleByElements specifies selection criteria to be used to select ProductionPlanningOrders. PlanningVersionID is a unique identifier for a planning version containing all master and transaction data necessary for planning. SelectionByProductionPlanningOrderTypeCode is a range of ProductionPlanningOrderTypeCode identifiers. InclusionExclusionCode is a coded representation of the inclusion of a set into a result set or the exclusion of it. IntervalBoundaryTypeCode is a coded representation of an interval boundary type. LowerBoundaryProductionPlanningOrderTypeCode is the lower boundary of the ProductionPlanningOrderTypeCode UpperBoundaryProductionPlanningOrderTypeCode is the upper boundary of the ProductionPlanningOrderTypeCode. SelectionBySupplyPlanningAreaID is a range of SupplyPlanningAreaID identifiers. LowerBoundarySupplyPlanningAreaID is a unique identifier for a SupplyPlanningArea. The LowerBoundarySupplyPlanningAreaID is the lower boundary of the SupplyPlanningAreaID identifier interval. UpperBoundarySupplyPlanningAreaID is a unique identifier for a SupplyPlanningArea. The UpperBoundarySupplyPlanningAreaID is the upper boundary of the SupplyPlanningAreaID identifier interval. SelectionByProductInternalID is a range of proprietary identifiers for Product. LowerBoundaryProductInternalID is a proprietary identifier for a Product. The LowerBoundaryProductInternalID is the lower boundary of the ProductInternalID identifier interval. UpperBoundaryProductInternalID is a Proprietary identifier for a Product. The UpperBoundaryProductInternalID is the upper boundary of the ProductInternalID identifier interval. SelectionByResourceID is a range of ResourceID identifiers. LowerBoundaryResourceID is a unique identifier for a resource on which capacity requirement for a production planning order is dispatched. The LowerBoundaryResourceID is the lower boundary of the ResourceID identifier interval. UpperBoundaryResourceID is a unique identifier for a resource on which capacity requirement for a ProductionPlanningOrder is dispatched. The UpperBoundaryResourceID is the upper boundary of the ResourceID identifier interval. SelectionByAvailabilityDateTime is a range of AvailabilityDateTime identifiers. LowerBoundaryAvailabilityDateTime is a date/time on which the material output should be available. The LowerBoundaryAvailabilityDateTime is the lower boundary of the AvailabilityDateTime interval. UpperBoundaryAvailabilityDateTime is a date/time on which the material output should be available. The UpperBoundaryAvailabilityDateTime is the upper boundary of the AvailabilityDateTime interval.

Message Data Type

The message data type ProductionPlanningOrderSimpleByElementsResponseMessage_sync contains the ProductionPlanningOrderSimpleByElementsResponse included in the business document and the business information that is relevant for sending a business document in a message. It contains the MessageHeader, ProductionPlanningOrder, and Log packages. FIG. 472 shows a ProductionPlanningOrderSimpleByElementsResponseMessage_sync 472000 package. The ProductionPlanningOrderSimpleByElementsResponseMessage_sync 472000 package is a ProductionPlanningOrderSimpleByElementsResponseMessage_sync 472004 datatype. The ProductionPlanningOrderSimpleByElementsResponseMessage_sync 472000 package includes a ProductionPlanningOrderSimpleByElementsResponseMessage_sync 472002 entity. The ProductionPlanningOrderSimpleByElementsResponseMessage_sync 472000 package includes various packages, namely MessageHeader 472006, ProductionPlanningOrder 472014 and Log 472026.

The MessageHeader 472006 package is a BasicBusinessDocumentMessageHeader 472012 datatype. The MessageHeader 472006 package includes a MessageHeader 472008 entity.

The MessageHeader 472008 entity has a cardinality of one 472010 meaning that for each instance of the ProductionPlanningOrderSimpleByElementsResponseMessage_sync 472002 entity there is one MessageHeader 472008 entity.

The ProductionPlanningOrder 472014 package includes a ProductionPlanningOrder 472016 entity.

The ProductionPlanningOrder 472016 entity has a cardinality of zero or n 472018 meaning that for each instance of the ProductionPlanningOrderSimpleByElementsResponseMessage_sync 472002 entity there may be one or more ProductionPlanningOrder 472016 entities. The ProductionPlanningOrder 472016 entity includes an ID 472020 attribute.

The ID 472020 attribute is a BusinessTransactionDocumentID 472024 datatype. The ID 472020 attribute has a cardinality of one 472022 meaning that for each instance of the ProductionPlanningOrder 472016 entity there is one ID 472020 attribute.

The Log 472026 package is a Log 472032 datatype. The Log 472026 package includes a Log 472028 entity.

The Log 472028 entity has a cardinality of one 472030 meaning that for each instance of the ProductionPlanningOrderSimpleByElementsResponseMessage_sync 472002 entity there is one Log 472028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element, which is of type GDT: BasicBusinessDocumentMessageHeader.

ProductionPlanningOrder Package

ProductionPlanningOrder

The ProductionPlanningOrder contains the ID element. The ID element is an identifier for a production planning order.

Log Package

A log is a sequence of messages that may result from the execution of an application task.

Message Data Type

The message data type ProductionPlanningOrderbyIDQueryMessage_sync contains the ProductionPlanningOrderByIDQuery included in the business document and the business information that is relevant for sending a business document in a message. It contains the Selection package. FIG. 465 shows a ProductionPlanningOrderByIDQueryMessage_sync 465000 package. The ProductionPlanningOrderByIDQueryMessage_sync 465000 package is a ProductionPlanningOrderByIDQueryMessage_sync 465004 datatype. The ProductionPlanningOrderByIDQueryMessage_sync 465000 package includes a ProductionPlanningOrderByIDQueryMessage_sync 465002 entity. The ProductionPlanningOrderByIDQueryMessage_sync 465000 package includes a Selection 465006 package.

The Selection 465006 package includes a ProductionPlanningOrderSelectionByID 465008 entity.

The ProductionPlanningOrderSelectionByID 465008 entity has a cardinality of one 465010 meaning that for each instance of the ProductionPlanningOrderByIDQueryMessage_sync 465002 entity there is one ProductionPlanningOrderSelectionByID 465008 entity. The ProductionPlanningOrderSelectionByID 465008 entity includes an ID 465012 attribute.

The ID 465012 attribute is a BusinessTransactionDocumentID 465016 datatype. The ID 465012 attribute has a cardinality of one 465014 meaning that for each instance of the ProductionPlanningOrderSelectionByID 465008 entity there is one ID 465012 attribute.

Selection Package

ProductionPlanningOrderSelectionByID

The ProductionPlanningOrderSelectionByID specifies the ID of the ProductionPlanningOrder to be queried. ProductionPlanningOrderSelectionByID is an identifier for production planning order. ID is an identifier for a production planning order.

Message Data Type

The message data type ProductionPlanningOrderByIDResponseMessage_sync contains the ProductionPlanningOrderByIDResponse included in the business document and the business information that is relevant for sending a business document in a message. It contains the MessageHeader, ProductionPlanningOrder, and Log packages. FIGS. 463-1 through 463-27 show a ProductionPlanningOrderByIDResponsetMessage_sync 463000 package. The ProductionPlanningOrderByIDResponsetMessage_sync 463000 package is a ProductionPlanningOrderByIDResponseMessage_sync 463004 datatype. The ProductionPlanningOrderByIDResponsetMessage_sync 463000 package includes a ProductionPlanningOrderByIDResponseMessage_sync 463002 entity. The ProductionPlanningOrderByIDResponsetMessage_sync 463000 package includes various packages, namely MessageHeader 463006, ProductionPlanningOrder 463014 and Log 4630700.

The MessageHeader 463006 package is a BasicBusinessDocumentMessageHeader 463012 datatype. The MessageHeader 463006 package includes a MessageHeader 463008 entity.

The MessageHeader 463008 entity has a cardinality of one 463010 meaning that for each instance of the ProductionPlanningOrderByIDResponseMessage_sync 463002 entity there is one MessageHeader 463008 entity.

The ProductionPlanningOrder 463014 package includes a ProductionPlanningOrder 463016 entity. The ProductionPlanningOrder 463014 package includes various packages, namely Operation 4630116, CapacityRequirement 4630288 and Component 4630376.

The ProductionPlanningOrder 463016 entity has a cardinality of zero or one 463018 meaning that for each instance of the ProductionPlanningOrderByIDResponseMessage_sync 463002 entity there may be one ProductionPlanningOrder 463016 entity. The ProductionPlanningOrder 463016 entity includes various attributes, namely ID 463020, PlanningVersionID 463026, SupplyPlanningAreaID 463032, ProductionModelID 463038, SystemAdministrativeData 463044, SourceOfSupplyExplosionDate 463050, TypeCode 463056, LogisticsPlanningDetailLevelCode 463062, ValidityPeriod 463068, PlannedPeriod 463074, OpeningDateTime 463080, FixedIndicator 463086, SourceOfSupplyFixedIndicator 463092, ConversionAllowedIndicator 463098, MaterialSupplyAndDemandStatusCode 4630104 and LifeCycleStatusCode 4630110.

The ID 463020 attribute is a BusinessTransactionDocumentID 463024 datatype. The ID 463020 attribute has a cardinality of one 463022 meaning that for each instance of the ProductionPlanningOrder 463016 entity there is one ID 463020 attribute.

The PlanningVersionID 463026 attribute is a PlanningVersionID 463030 datatype. The PlanningVersionID 463026 attribute has a cardinality of one 463028 meaning that for each instance of the ProductionPlanningOrder 463016 entity there is one PlanningVersionID 463026 attribute.

The SupplyPlanningAreaID 463032 attribute is a SupplyPlanningAreaID 463036 datatype. The SupplyPlanningAreaID 463032 attribute has a cardinality of one 463034 meaning that for each instance of the ProductionPlanningOrder 463016 entity there is one SupplyPlanningAreaID 463032 attribute.

The ProductionModelID 463038 attribute is a ProductionModelID 463042 datatype. The ProductionModelID 463038 attribute has a cardinality of zero or one 463040 meaning that for each instance of the ProductionPlanningOrder 463016 entity there may be one ProductionModelID 463038 attribute.

The SystemAdministrativeData 463044 attribute is a SystemAdministrativeData 463048 datatype. The SystemAdministrativeData 463044 attribute has a cardinality of one 463046 meaning that for each instance of the ProductionPlanningOrder 463016 entity there is one SystemAdministrativeData 463044 attribute.

The SourceOfSupplyExplosionDate 463050 attribute is an ExplosionDate 463054 datatype. The SourceOfSupplyExplosionDate 463050 attribute has a cardinality of zero or one 463052 meaning that for each instance of the ProductionPlanningOrder 463016 entity there may be one SourceOfSupplyExplosionDate 463050 attribute.

The TypeCode 463056 attribute is a BusinessTransactionDocumentTypeCode 463060 datatype. The TypeCode 463056 attribute has a cardinality of one 463058 meaning that for each instance of the ProductionPlanningOrder 463016 entity there is one TypeCode 463056 attribute.

The LogisticsPlanningDetailLevelCode 463062 attribute is a LogisticsPlanningDetailLevelCode 463066 datatype. The LogisticsPlanningDetailLevelCode 463062 attribute has a cardinality of zero or one 463064 meaning that for each instance of the ProductionPlanningOrder 463016 entity there may be one LogisticsPlanningDetailLevelCode 463062 attribute.

The ValidityPeriod 463068 attribute is a ValidityUPPEROPEN_LOCALNORMALISED_DateTimePeriod 463072 datatype. The ValidityPeriod 463068 attribute has a cardinality of one 463070 meaning that for each instance of the ProductionPlanningOrder 463016 entity there is one ValidityPeriod 463068 attribute.

The PlannedPeriod 463074 attribute is a PlannedUPPEROPEN_LOCALNORMALISED_DateTimePeriod 463078 datatype. The PlannedPeriod 463074 attribute has a cardinality of one 463076 meaning that for each instance of the ProductionPlanningOrder 463016 entity there is one PlannedPeriod 463074 attribute.

The OpeningDateTime 463080 attribute is an OpeningLOCALNORMALSED_DateTime 463084 datatype. The OpeningDateTime 463080 attribute has a cardinality of one 463082 meaning that for each instance of the ProductionPlanningOrder 463016 entity there is one OpeningDateTime 463080 attribute.

The FixedIndicator 463086 attribute is a FixedIndicator 463090 datatype. The FixedIndicator 463086 attribute has a cardinality of zero or one 463088 meaning that for each instance of the ProductionPlanningOrder 463016 entity there may be one FixedIndicator 463086 attribute.

The SourceOfSupplyFixedIndicator 463092 attribute is a FixedIndicator 463096 datatype. The SourceOfSupplyFixedIndicator 463092 attribute has a cardinality of zero or one 463094 meaning that for each instance of the ProductionPlanningOrder 463016 entity there may be one SourceOfSupplyFixedIndicator 463092 attribute.

The ConversionAllowedIndicator 463098 attribute is an AllowedIndicator 4630102 datatype. The ConversionAllowedIndicator 463098 attribute has a cardinality of zero or one 4630100 meaning that for each instance of the ProductionPlanningOrder 463016 entity there may be one ConversionAllowedIndicator 463098 attribute.

The MaterialSupplyAndDemandStatusCode 4630104 attribute is a PRODUCTION_MaterialSupplyAndDemandStatusCode 4630108 datatype. The MaterialSupplyAndDemandStatusCode 4630104 attribute has a cardinality of one 4630106 meaning that for each instance of the ProductionPlanningOrder 463016 entity there is one MaterialSupplyAndDemandStatusCode 4630104 attribute.

The LifeCycleStatusCode 4630110 attribute is a ProductionPlanningOrderLifeCycleStatusCode 4630114 datatype. The LifeCycleStatusCode 4630110 attribute has a cardinality of zero or one 4630112 meaning that for each instance of the ProductionPlanningOrder 463016 entity there may be one LifeCycleStatusCode 4630110 attribute.

The Operation 4630116 package includes an Operation 4630118 entity.

The Operation 4630118 entity has a cardinality of one or n 4630120 meaning that for each instance of the ProductionPlanningOrder 463016 entity there are one or more Operation 4630118 entities. The Operation 4630118 entity includes various attributes, namely ID 4630122, Description 4630128, PlannedPeriod 4630134, PlannedDuration 4630140, FixedIndicator 4630146 and ProductionConfirmationRecordTypeCode 4630152. The Operation 4630118 entity has various subordinate entities, namely Alternative 4630158 and Activity 4630192.

The ID 4630122 attribute is an OperationID 4630126 datatype. The ID 4630122 attribute has a cardinality of one 4630124 meaning that for each instance of the Operation 4630118 entity there is one ID 4630122 attribute.

The Description 4630128 attribute is an OperationMEDIUM_Description 4630132 datatype. The Description 4630128 attribute has a cardinality of zero or one 4630130 meaning that for each instance of the Operation 4630118 entity there may be one Description 4630128 attribute.

The PlannedPeriod 4630134 attribute is a PlannedUPPEROPEN_LOCALNORMALISED_DateTimePeriod 4630138 datatype. The PlannedPeriod 4630134 attribute has a cardinality of zero or one 4630136 meaning that for each instance of the Operation 4630118 entity there may be one PlannedPeriod 4630134 attribute.

The PlannedDuration 4630140 attribute is a PlannedTIME_Duration 4630144 datatype. The PlannedDuration 4630140 attribute has a cardinality of zero or one 4630142 meaning that for each instance of the Operation 4630118 entity there may be one PlannedDuration 4630140 attribute.

The FixedIndicator 4630146 attribute is a FixedIndicator 4630150 datatype. The FixedIndicator 4630146 attribute has a cardinality of zero or one 4630148 meaning that for each instance of the Operation 4630118 entity there may be one FixedIndicator 4630146 attribute.

The ProductionConfirmationRecordTypeCode 4630152 attribute is a ProductionConfirmationRecordTypeCode 4630156 datatype. The ProductionConfirmationRecordTypeCode 4630152 attribute has a cardinality of zero or one 4630154 meaning that for each instance of the Operation 4630118 entity there may be one ProductionConfirmationRecordTypeCode 4630152 attribute.

The Alternative 4630158 entity has a cardinality of one or n 4630160 meaning that for each instance of the Operation 4630118 entity there are one or more Alternative 4630158 entities. The Alternative 4630158 entity includes various attributes, namely ID 4630162, ResourceID 4630168, ProcessingDuration 4630174, PriorityValue 4630180 and ActiveIndicator 4630186.

The ID 4630162 attribute is an OperationAlternativeID 4630166 datatype. The ID 4630162 attribute has a cardinality of one 4630164 meaning that for each instance of the Alternative 4630158 entity there is one ID 4630162 attribute.

The ResourceID 4630168 attribute is a ResourceID 4630172 datatype. The ResourceID 4630168 attribute has a cardinality of one 4630170 meaning that for each instance of the Alternative 4630158 entity there is one ResourceID 4630168 attribute.

The ProcessingDuration 4630174 attribute is a ProcessingTIME_Duration 4630178 datatype. The ProcessingDuration 4630174 attribute has a cardinality of zero or one 4630176 meaning that for each instance of the Alternative 4630158 entity there may be one ProcessingDuration 4630174 attribute.

The PriorityValue 4630180 attribute is a PriorityValue 4630184 datatype. The PriorityValue 4630180 attribute has a cardinality of one 4630182 meaning that for each instance of the Alternative 4630158 entity there is one PriorityValue 4630180 attribute.

The ActiveIndicator 4630186 attribute is an ActiveIndicator 4630190 datatype. The ActiveIndicator 4630186 attribute has a cardinality of one 4630188 meaning that for each instance of the Alternative 4630158 entity there is one ActiveIndicator 4630186 attribute.

The Activity 4630192 entity has a cardinality of one or n 4630194 meaning that for each instance of the Operation 4630118 entity there are one or more Activity 4630192 entities. The Activity 4630192 entity includes various attributes, namely OperationID 4630196, OperationActivityTypeCode 4630202, EngineeringChangeOrderID 4630208, ProcessingDuration 4630214, PlannedPeriod 4630220, FixedIndicator 4630226 and ProductionConfirmationRecordTypeCode 4630232. The Activity 4630192 entity has various subordinate entities, namely Relationship 4630238 and PropertyValuation 4630266.

The OperationID 4630196 attribute is an OperationID 4630200 datatype. The OperationID 4630196 attribute has a cardinality of one 4630198 meaning that for each instance of the Activity 4630192 entity there is one OperationID 4630196 attribute.

The OperationActivityTypeCode 4630202 attribute is an OperationActivityTypeCode 4630206 datatype. The OperationActivityTypeCode 4630202 attribute has a cardinality of one 4630204 meaning that for each instance of the Activity 4630192 entity there is one OperationActivityTypeCode 4630202 attribute.

The EngineeringChangeOrderID 4630208 attribute is an EngineeringChangeOrderID 4630212 datatype. The EngineeringChangeOrderID 4630208 attribute has a cardinality of zero or one 4630210 meaning that for each instance of the Activity 4630192 entity there may be one EngineeringChangeOrderID 4630208 attribute.

The ProcessingDuration 4630214 attribute is a ProcessingTIME_Duration 4630218 datatype. The ProcessingDuration 4630214 attribute has a cardinality of zero or one 4630216 meaning that for each instance of the Activity 4630192 entity there may be one ProcessingDuration 4630214 attribute.

The PlannedPeriod 4630220 attribute is a PlannedUPPEROPEN_LOCALNORMALISED_DateTimePeriod 4630224 datatype. The PlannedPeriod 4630220 attribute has a cardinality of zero or one 4630222 meaning that for each instance of the Activity 4630192 entity there may be one PlannedPeriod 4630220 attribute.

The FixedIndicator 4630226 attribute is a FixedIndicator 4630230 datatype. The FixedIndicator 4630226 attribute has a cardinality of zero or one 4630228 meaning that for each instance of the Activity 4630192 entity there may be one FixedIndicator 4630226 attribute.

The ProductionConfirmationRecordTypeCode 4630232 attribute is a ProductionConfirmationRecordTypeCode 4630236 datatype. The ProductionConfirmationRecordTypeCode 4630232 attribute has a cardinality of zero or one 4630234 meaning that for each instance of the Activity 4630192 entity there may be one ProductionConfirmationRecordTypeCode 4630232 attribute.

The Relationship 4630238 entity has a cardinality of zero or n 4630240 meaning that for each instance of the Activity 4630192 entity there may be one or more Relationship 4630238 entities. The Relationship 4630238 entity includes various attributes, namely SuccessorOperationID 4630242, SuccessorOperationActivityTypeCode 4630248, NetworkPlanElementSuccessionTypeCode 4630254 and NetMinimumDuration 4630260.

The SuccessorOperationID 4630242 attribute is a SuccessorOperationID 4630246 datatype. The SuccessorOperationID 4630242 attribute has a cardinality of one 4630244 meaning that for each instance of the Relationship 4630238 entity there is one SuccessorOperationID 4630242 attribute.

The SuccessorOperationActivityTypeCode 4630248 attribute is a SuccessorOperationActivityTypeCode 4630252 datatype. The SuccessorOperationActivityTypeCode 4630248 attribute has a cardinality of one 4630250 meaning that for each instance of the Relationship 4630238 entity there is one SuccessorOperationActivityTypeCode 4630248 attribute.

The NetworkPlanElementSuccessionTypeCode 4630254 attribute is a NetworkPlanElementSuccessionTypeCode 4630258 datatype. The NetworkPlanElementSuccessionTypeCode 4630254 attribute has a cardinality of one 4630256 meaning that for each instance of the Relationship 4630238 entity there is one NetworkPlanElementSuccessionTypeCode 4630254 attribute.

The NetMinimumDuration 4630260 attribute is a MinimumTIME_Duration 4630264 datatype. The NetMinimumDuration 4630260 attribute has a cardinality of zero or one 4630262 meaning that for each instance of the Relationship 4630238 entity there may be one NetMinimumDuration 4630260 attribute.

The PropertyValuation 4630266 entity has a cardinality of zero or n 4630268 meaning that for each instance of the Activity 4630192 entity there may be one or more PropertyValuation 4630266 entities. The PropertyValuation 4630266 entity includes various attributes, namely PropertyID 4630270, PropertyValue 4630276 and PropertyValueName 4630282.

The PropertyID 4630270 attribute is a PropertyID 4630274 datatype. The PropertyID 4630270 attribute has a cardinality of one 4630272 meaning that for each instance of the PropertyValuation 4630266 entity there is one PropertyID 4630270 attribute.

The PropertyValue 4630276 attribute is a PropertyValue 4630280 datatype. The PropertyValue 4630276 attribute has a cardinality of one 4630278 meaning that for each instance of the PropertyValuation 4630266 entity there is one PropertyValue 4630276 attribute.

The PropertyValueName 4630282 attribute is a PropertyValueMEDIUM_Name 4630286 datatype. The PropertyValueName 4630282 attribute has a cardinality of zero or one 4630284 meaning that for each instance of the PropertyValuation 4630266 entity there may be one PropertyValueName 4630282 attribute.

The CapacityRequirement 4630288 package includes a CapacityRequirement 4630290 entity.

The CapacityRequirement 4630290 entity has a cardinality of one or n 4630292 meaning that for each instance of the ProductionPlanningOrder 463016 entity there are one or more CapacityRequirement 4630290 entities. The CapacityRequirement 4630290 entity includes various attributes, namely OperationAlternativeID 4630294, OperationID 4630300, OperationActivityTypeCode 4630306, ResourceID 4630312, ResourceTypeCode 4630318, ProcessingDuration 4630324, ActiveIndicator 4630330 and PlannedPeriod 4630336. The CapacityRequirement 4630290 entity includes a Relationship 4630342 subordinate entity.

The OperationAlternativeID 4630294 attribute is an OperationAlternativeID 4630298 datatype. The OperationAlternativeID 4630294 attribute has a cardinality of one 4630296 meaning that for each instance of the CapacityRequirement 4630290 entity there is one OperationAlternativeID 4630294 attribute.

The OperationID 4630300 attribute is an OperationID 4630304 datatype. The OperationID 4630300 attribute has a cardinality of one 4630302 meaning that for each instance of the CapacityRequirement 4630290 entity there is one OperationID 4630300 attribute.

The OperationActivityTypeCode 4630306 attribute is an OperationActivityTypeCode 4630310 datatype. The OperationActivityTypeCode 4630306 attribute has a cardinality of one 4630308 meaning that for each instance of the CapacityRequirement 4630290 entity there is one OperationActivityTypeCode 4630306 attribute.

The ResourceID 4630312 attribute is a ResourceID 4630316 datatype. The ResourceID 4630312 attribute has a cardinality of one 4630314 meaning that for each instance of the CapacityRequirement 4630290 entity there is one ResourceID 4630312 attribute.

The ResourceTypeCode 4630318 attribute is a ResourceTypeCode 4630322 datatype. The ResourceTypeCode 4630318 attribute has a cardinality of one 4630320 meaning that for each instance of the CapacityRequirement 4630290 entity there is one ResourceTypeCode 4630318 attribute.

The ProcessingDuration 4630324 attribute is a ProcessingTIME_Duration 4630328 datatype. The ProcessingDuration 4630324 attribute has a cardinality of zero or one 4630326 meaning that for each instance of the CapacityRequirement 4630290 entity there may be one ProcessingDuration 4630324 attribute.

The ActiveIndicator 4630330 attribute is an ActiveIndicator 4630334 datatype. The ActiveIndicator 4630330 attribute has a cardinality of zero or one 4630332 meaning that for each instance of the CapacityRequirement 4630290 entity there may be one ActiveIndicator 4630330 attribute.

The PlannedPeriod 4630336 attribute is a PlannedUPPEROPEN_LOCALNORMALISED_DateTimePeriod 4630340 datatype. The PlannedPeriod 4630336 attribute has a cardinality of zero or one 4630338 meaning that for each instance of the CapacityRequirement 4630290 entity there may be one PlannedPeriod 4630336 attribute.

The Relationship 4630342 entity has a cardinality of zero or n 4630344 meaning that for each instance of the CapacityRequirement 4630290 entity there may be one or more Relationship 4630342 entities. The Relationship 4630342 entity includes a SuccessorOperationAlternativeID 4630346 attribute.

The SuccessorOperationAlternativeID 4630346 attribute is a SuccessorOperationAlternativeID 4630350 datatype. The SuccessorOperationAlternativeID 4630346 attribute has a cardinality of one 4630348 meaning that for each instance of the Relationship 4630342 entity there is one SuccessorOperationAlternativeID 4630346 attribute.

The Component 4630376 package includes a MaterialOutput 4630378 entity.

The MaterialOutput 4630378 entity has a cardinality of one or n 4630380 meaning that for each instance of the ProductionPlanningOrder 463016 entity there are one or more MaterialOutput 4630378 entities.

The Log 4630700 package is a Log 4630706 datatype. The Log 4630700 package includes a Log 4630702 entity.

The Log 4630702 entity has a cardinality of one 4630704 meaning that for each instance of the ProductionPlanningOrderByIDResponseMessage_sync 463002 entity there is one Log 4630702 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application.

ProductionPlanningOrder Package

The ProductionPlanningOrder package groups the information relevant to describe a ProductionPlanningOrder. It contains the ProductionPlanningOrder entity. It contains the Operation, CapacityRequirement, and Component packages.

ProductionPlanningOrder

Within the material requirements planning a ProductionPlanningOrder is a request to initiate the in-house production of a particular quantity of a material on a defined date. ID is an identifier for a production planning order. PlanningVersionID is a unique identifier for a Planning Version containing all necessary master and transaction data for planning. SupplyPlanningAreaID is a unique identifier of a SupplyPlanningArea for which the ProductionPlanningOrder is planned. ProductionModelID is a unique identifier for a ProductionModel containing the production process for manufacturing the MaterialOutput. SystemAdministrativeData is an administrative data for the production planning order. This data includes system users and change times. SourceOfSupplyExplosionDate is a date for which the source of supply was exploded. TypeCode is a coded representation of the document type that occurs in business transactions. LogisticsPlanningDetailLevelCode specifies the level of detail of planning. ValidityPeriod is a validity period of the production planning order. PlannedPeriod is a period which the production planning order is dispatched to. OpeningDateTime is a point in time at which production can be requested for the production planning order in order to ensure that the goods that are to be ordered are received in time. FixedIndicator specifies whether the production planning order is fixed or not.

SourceOfSupplyFixedIndicator specifies whether the source of supply is fixed for the production planning order or not. ConversionAllowedIndicator specifies that it is allowed to convert the ProductionPlanningOrder into a ProductionOrder. MaterialSupplyAndDemandStatusCode is a coded representation of the status of material supplies and material requirements. LifeCycleStatusCode describes the planning status of the operation.

Operation Package

The Operation package contains the Operation, Alternative, Activity, Relationship, and PropertyValuation entities.

Operation

In the production planning order, an Operation is a planning-based, and therefore sometimes approximate, representation of one or more operations in production. ID is a unique identifier of an operation. Description is a description of an operation. PlannedPeriod is a period which the operation is scheduled to. The period is derived from the scheduling of the operation. PlannedDuration is a duration of the period which the operation is scheduled to. FixedIndicator specifies the operation is fixed on a resource at a specific time. ProductionConfirmationRecordTypeCode is a coded representation of the type of production confirmation record, describing the execution status of the Operation.

Alternative

An Alternative entity is a planning alternative for an operation. ID is an identifier for an operation alternative. ResourceID is a unique identifier of the resource to which the capacity requirements of the operation alternative are scheduled. ProcessingDuration is a processing duration of the operation if the operation alternative is active. PriorityValue is a representation of the priority of the operation alternative used when choosing the active alternative of an operation. ActiveIndicator specifies whether this is the operation alternative that is active in scheduling.

If alternative process flows or alternative assignments for the main resource are maintained in the process definition, several planning alternatives are normally created for an operation. In principal, one planning alternative is created per process flow and per assignment of a main resource. In this respect, there is also one planning alternative, if the process flow and the main resource assignment of an operation is uniquely specified Activity From a planning point of view, an Activity is a basic work step in an operation during the execution of the production planning order. OperationID is a unique identifier of an operation. OperationActivityTypeCode is a coded representation of a categorization of activities in an operation. The type categorizes activities according to task. EngineeringChangeOrderID is a unique identifier for an engineering change order. An engineering change order is a set of instructions to a number of objects from the areas of engineering or production. It defines the conditions under which these changes become effective and specifies the release status of these changes. ProcessingDuration is a duration of the work step represented by the activity. PlannedPeriod is a period in which the activity is scheduled to be carried out. FixedIndicator specifies the activity is fixed on a resource at a specific time. ProductionConfirmationRecordTypeCode is a coded representation of the type of production confirmation record, describing the execution status of the Activity.

Relationship

A Relationship is a sequence relationship between two planning activities. SuccessorOperationID is a unique identifier of the successor operation i.e. the operation to which the relationship leads. SuccessorOperationActivityTypeCode is a coded representation of the SuccessorOperationActivity type within the SuccessorOperation, that is, the OperationActivity to which the relationship leads. NetworkPlanElementSuccessionTypeCode specifies the type of the relationship between predecessor and successor activity. NetMinimumDuration specifies the minimum (time) interval, without breaks and interruptions, that should be maintained between the predecessor and the successor activities. Relationships between activities are used to represent complex process flows in the in-house production process, such as parallel sequences of operations and activities. In this case, relationships are used to describe the branching and rejoining of process flows. In addition, these relationships contain planning parameters such as the minimum interval between two activities.

PropertyValuation

A PropertyValuation is the value of the property assigned to the activity. PropertyID is a unique identifier for a property. PropertyValue describes a value that can be assigned to a property. PropertyValueName describes the name of the PropertyValue.

Capacity Requirement Package

The Capacity Requirement package contains the CapacityRequirement and CapacityRequirementRelationship entities.

CapacityRequirement

CapacityRequirement represents the capacity of a work centre which is planned to be required for production execution.

OperationAlternativeID is an identifier for the operation alternative to which the capacity requirement is assigned. OperationID is a unique identifier of an operation. OperationActivityTypeCode is a coded representation of a categorization of activities in an operation. The type categorizes activities according to task. ResourceID is a unique identifier of the resource. ResourceTypeCode is a coded representation of the type of resource within a logistics facility. ProcessingDuration is a processing duration that the capacity requirement occupies at the resource. ActiveIndicator specifies whether the capacity requirement belongs to the active operation alternative. PlannedPeriod is a period in which the capacity requirement is planned. The period is specified if the capacity requirement belongs to the operation alternative that is active in scheduling.

Relationship

A Relationship entity is a sequence relationship between two capacity requirements. SuccessorOperationAlternativeID is an identifier for the SuccessorOperationAlternative for a CapacityRequirement. SuccessorOperationID is a unique identifier of the SuccessorOperation for a CapacityRequirement. SuccessorOperationActivityTypeCode is a coded representation of the SuccessorOperationActivityTypeCode for a CapacityRequirement. SuccessorResourceID is a unique identifier of the SuccessorResource. ResourceTypeCode is a coded representation of the type of resource within a logistics facility.

Component Package

The Component package contains the MaterialOutput, PropertyValuation, MaterialInput and PropertyValuation entities.

MaterialOutput

A MaterialOutput represents a material which is planned to be produced. ID is a position of a MaterialOutput within the ProductionPlanningOrder. ProductInternalID is a proprietary identifier for a MaterialOutput. SupplyPlanningAreaID is a unique identifier of a SupplyPlanningArea for which a stock receipt is planned via the production of the MaterialOutput.

InventorySpecialStockTypeCode is a coded representation of inventory special stock type of the MaterialOutput. AccountAssignmentObjectName is a name identifying the account assignment object to which MaterialOutput is assigned. MaterialRoleCode is a role of the material in the production process and therefore the specialization of the MaterialOutput in the main material output, by-product output, or intermediate product output. MaterialSupplyAndDemandTypeCode specifies the type of supply of the material output. EngineeringChangeOrderID is a unique identifier for an engineering change order. An engineering change order is a set of instructions to a number of objects from the areas of engineering or production. It defines the conditions under which these changes become effective and specifies the release status of these changes. OperationID is a unique identifier of an operation. An operation is a self-contained section of a process in a logistics process description that is normally completely executed on one or more resources that represent the main resources. OperationActivityTypeCode is a coded representation of a categorization of activities in an operation. The type categorizes activities according to task. GroupID is a unique identifier of the group of material outputs to which the material output is assigned. ProductAvailabilityConfirmationStatusCode is a coded representation of the status of a confirmation given by a product availability check. ConfirmedAvailabilityDateTime is a confirmation DateTime returned by a successful product availability check. ConfirmedQuantity is a confirmed quantity returned by a successful product availability check. ConfirmedQuantityTypeCode is a coded representation of the type of the confirmed quantity returned by a product availability check. ProductionDateTime is a date/time on which production of the material output is planned to take place. AvailabilityDateTime is a date/time on which the material output should be available. PlannedQuantity is a planned quantity of the material output considering the quantity already produced, but not considering expected scrap. PlannedQuantityTypeCode is a coded representation of the type of the planned quantity of the material output. TotalQuantity is a total quantity of the material output including expected scrap. TotalQuantityTypeCode is a coded representation of the type of the total quantity of the material output. PriorityValue is a representation of the priority of the MaterialOutput. The priority is inherited from the corresponding customer requirement if specified but can be changed manually in planning processes. FixedIndicator specifies whether the material output is fixed or not.

PropertyValuation

A PropertyValuation is the value of the property assigned to the activity. PropertyID is a unique identifier for a property. PropertyValue describes a value that can be assigned to a property. PropertyValueName describes the name of the PropertyValue.

MaterialInput

A MaterialInput represents a material which is needed for producing the output materials. ID is a position of a MaterialInput within the ProductionPlanningOrder. ProductInternalID is a proprietary identifier for a MaterialInput. SupplyPlanningAreaID is a unique identifier of a SupplyPlanningArea to which the MaterialInput relates. MaterialRoleCode is a role of the material in the production process and therefore the specialization of the MaterialInput in the ComponentInput or intermediate ProductInput. MaterialSupplyAndDemandTypeCode is a type of demand of the material input. EngineeringChangeOrderID is a unique identifier for an engineering change order. An engineering change order is a set of instructions to a number of objects from the areas of engineering or production. It defines the conditions under which these changes become effective and specifies the release status of these changes. LogisticsAreaID is a unique identifier for a LogisticsArea for storage of the MaterialInput before it is consumed. OperationID is a unique identifier of an operation. OperationActivityTypeCode is a coded representation of a categorization of activities in an operation. The type categorizes activities according to task. GroupID is a unique identifier of the group of material inputs to which the material input is assigned. ProductAvailabilityConfirmationStatusCode is a coded representation of the status of a confirmation given by a product availability check. ConfirmedAvailabilityDateTime is a confirmation DateTime returned by a successful product availability check. ConfirmedQuantity is a confirmed quantity returned by a successful product availability check. ConfirmedQuantityTypeCode is a coded representation of the type of the confirmed quantity returned by a product availability check. IssuingStatusCode is a coded representation of the status indicating whether the MaterialInput has been issued from stock or not. DueDateTime is a point in time at which the material input in due. PlannedQuantity is a planned quantity of the material input considering the quantity already withdrawn for production, but not considering the expected scrap. PlannedQuantityTypeCode is a coded representation of the type of the planned quantity of the material input. TotalQuantity is a total quantity of the material input considering expected scrap. TotalQuantityTypeCode is a coded representation of the type of the planned quantity of the material input. PriorityValue is a representation of the priority of the MaterialInput. The priority is inherited from the corresponding customer requirement if specified but can be changed manually in planning processes. FixedIndicator specifies whether the material input is fixed or not.

PropertyValuation

A PropertyValuation is the value of the property assigned to the activity. PropertyID is a unique identifier for a property. PropertyValue describes a value that can be assigned to a property. PropertyValueName describes the name of the PropertyValue.

Log Package

A log is a sequence of messages that may result from the execution of an application task.

ProductionBillOfMaterial Interfaces

Bills of material list all the parts products are made of and their dependencies to each other, from which the product's structure can be derived respectively. Bills of material are used as a basis for operation planning and production control, within production order management department to plan the provision of materials and other areas. Whenever a user wants to access a variant of a bill of material, the user needs its key data from incomplete key information. In a second step the user wants to know the parts of a given variant.

Message Choreography

The message choreography of FIG. 408 describes a possible logical sequence of messages that can be used to realize a production bill of material business scenario.

A ProductionBillOfMaterialVariantBasicDataByMaterialAndPlantQuery_sync is an inquiry to Production Model Processing for variants.

A ProductionBillOfMaterialVariantBasicDataByMaterialAndPlantResponse_sync is the response to a ProductionBillOfMaterialVariantBasicDataByMaterialAndPlantQuery_sync.

A ProductionBillOfMaterialVariantItemBasicDataByVariantIdentifyingElementsQuery_sync is an inquiry to Production Model Processing for items of the specified variant.

A ProductionBillOfMaterialVariantItemBasicDataByVariantIdentifyingElementsResponse_sync is the response to a ProductionBillOfMaterialVariantItemBasicDataBy VariantIdentifyingElementsQuery_sync.

A ProductionBillOfMaterialVariantItemByVariantIdentifyingElementsQuery_sync is an inquiry to Production Model Processing for all items of the specified variant.

A ProductionBillOfMaterialVariantItemByVariantIdentifyingElementsResponse_sync is the response to a ProductionBillOfMaterialVariantItemByVariantIdentifyingElementsQuery_sync.

For example, a "Workshop Employee Sales Employee Product Line Manager" system 408002 can query production bills of material by material and plant using the ProductionBillOfMaterialVariantBasicDataByMaterialAndPlantQuery_sync message 408006 as shown, for example, in FIG. 409. A "Production Model Processing" system 408004 can respond to the query using the ProductionBillOfMaterialVariantBasicDataByMaterialAndPlantResponse_sync message 408008 as shown, for example, in FIG. 410. The "Workshop Employee Sales Employee Product Line Manager" system 408002 can query production bills of material by basic data by variant identifying elements using the ProductionBillOfMaterialVariantItemBasicDataByVariantIdentifyingElementsQuery_sync message 408010 as shown, for example, in FIG. 411. The "Production Model Processing" system 408004 can respond to the query using the ProductionBillOfMaterialVariantItemBasicDataByVariantIdentifyingElementsResponse_sync message 408012 as shown, for example, in FIG. 412. The "Workshop Employee Sales Employee Product Line Manager" system 408002 can query production bills of material by variant identifying elements using the ProductionBillOfMaterialVariantItemByVariantIdentifyingElementsQuery_sync message 408014 as shown, for example, in FIG. 413. The "Production Model Processing" system 408004 can respond to the query using the ProductionBillOfMaterialVariantItemByVariantIdentifyingElementsResponse_sync message 408016 as shown, for example, in FIG. 414.

Message Data Type

The message data type ProductionBillOfMaterialVariantBasicDataByMaterialAndPlantQueryMessage_sync contains the Selection included in the business document. FIGS. 415-1 through 415-2 show a ProductionBillOfMaterialVariantBasicDataByMaterialAndPlantQueryMessage_sync 415000 package. The ProductionBillOfMaterialVariantBasicDataByMaterialAndPlantQueryMessage_sync 415000 package is a ProductionBillOfMaterialVariantBasicDataByMaterialAndPlantQueryMessage_sync 415004 datatype. The ProductionBillOfMaterialVariantBasicDataByMaterialAndPlantQueryMessage_sync 415000 package includes a ProductionBillOfMaterialVariantBasicDataByMaterialAndPlantQueryMessage_sync 415002 entity. The ProductionBillOfMaterialVariantBasicDataByMaterialAndPlantQueryMessage_sync 415000 package includes a Selection 415006 package.

The Selection 415006 package is a ProductionBillOfMaterialVariantBasicDataSelectionByMaterialAndPlant 415012 datatype. The Selection 415006 package includes a ProductionBillOfMaterialVariantBasicDataSelectionByMaterialAndPlant 415008 entity. The ProductionBillOfMaterialVariantBasicDataSelectionByMaterialAndPlant 415008 entity has a cardinality of one 415010 meaning that for each instance of the ProductionBillOfMaterialVariantBasicDataByMaterialAndPlantQueryMessage_sync 415002 entity there is one ProductionBillOfMaterialVariantBasicDataSelectionByMaterialAndPlant 415008 entity. The ProductionBillOfMaterialVariantBasicDataSelectionByMaterialAndPlant 415008 entity includes various attributes, namely MaterialInternalID 415014, PlantID 415020, ProductionBillOfMaterialVariantID 415026, ValidityDate 415032 and ProductionBillOfMaterialVariantUsageCode 415038.

The MaterialInternalID 415014 attribute is a ProductInternalID 415018 datatype. The MaterialInternalID 415014 attribute has a cardinality of zero or one 415016 meaning that for each instance of the ProductionBillOfMaterialVariantBasicDataSelectionByMaterialAndPlant 415008 entity there may be one MaterialInternalID 415014 attribute.

The PlantID 415020 attribute is a PlantID 415024 datatype. The PlantID 415020 attribute has a cardinality of zero or one 415022 meaning that for each instance of the ProductionBillOfMaterialVariantBasicDataSelectionByMaterialAndPlant 415008 entity there may be one PlantID 415020 attribute.

The ProductionBillOfMaterialVariantID 415026 attribute is a ProductionBillOfMaterialVariantID 415030 datatype. The ProductionBillOfMaterialVariantID 415026 attribute has a cardinality of zero or one 415028 meaning that for each instance of the ProductionBillOfMaterialVariantBasicDataSelectionByMaterialAndPlant 415008 entity there may be one ProductionBillOfMaterialVariantID 415026 attribute.

The ValidityDate 415032 attribute is a Date 415036 datatype. The ValidityDate 415032 attribute has a cardinality of zero or one 415034 meaning that for each instance of the ProductionBillOfMaterialVariantBasicDataSelectionByMaterialAndPlant 415008 entity there may be one ValidityDate 415032 attribute.

The ProductionBillOfMaterialVariantUsageCode 415038 attribute is a ProductionBillOfMaterialVariantUsageCode 415042 datatype. The ProductionBillOfMaterialVariantUsageCode 415038 attribute has a cardinality of zero or one 415040 meaning that for each instance of the ProductionBillOfMaterialVariantBasicDataSelectionByMaterialAndPlant 415008 entity there may be one ProductionBillOfMaterialVariantUsageCode 415038 attribute.

Selection Package

The Selection package collects selection criteria for ProductionBillOfMaterialVariantBasicData retrieval.

ProductionBillOfMaterialVariantBasicDataSelectionByMaterialAndPlant

A ProductionBillOfMaterialVariantBasicDataSelectionByMaterialAndPlant specifies selection parameters for basic data of variants of bills of material. MaterialInternalID (may be optional) is a unique identifier for a product. Variants that represent the given material will be selected. PlantID (may be optional) refers to a structural organizational unit within a company. A plant has its own tax assignment. Variants located in the given plant will be selected. ProductionBillOfMaterialVariantID (may be optional) ProductionBillOfMaterialVariantID is an identifier for a variant of a ProductionBillOfMaterial. Variants with the specified VariantID will be selected. ValidityDate (may be optional) is the specification of an exact day in the Gregorian calendar. ValidityDate is a time point at which something is valid. Here ValidityDate specifies a day on which a variant has to be valid. If ValidityDate is not set, current date is assumed.

ProductionBillOfMaterialVariantUsageCode (may be optional) is the coded representation of the usage of a variant of a production bill of material. Variants with the specified UsageCode will be selected.

Message Data Type

The message data type ProductionBillOfMaterialVariantBasicDataByMaterialAndPlantResponseMessage_sync contains the ProductionBillOfMaterialVariantBasicData included in the business document and the business information that is relevant for sending information, warning or error messages when processing operations for the Document. FIGS. 416-1 through 416-3 show a ProductionBillOfMaterialVariantBasicDataByMaterialAndPlantResponseMessage_sync 416000 package. The ProductionBillOfMaterialVariantBasicDataByMaterialAndPlantResponseMessage_sync 416000 package is a ProductionBillOfMaterialVariantBasicDataByMaterialAndPlantResponseMessage_sync 416004 datatype. The ProductionBillOfMaterialVariantBasicDataByMaterialAndPlantResponseMessage_sync 416000 package includes a ProductionBillOfMaterialVariantBasicDataByMaterialAndPlantResponseMessage_sync 416002 entity. The ProductionBillOfMaterialVariantBasicDataByMaterialAndPlantResponseMessage_sync 416000 package includes various packages, namely ProductionBillOfMaterialVariantBasicData 416006 and Log 416092.

The ProductionBillOfMaterialVariantBasicData 416006 package is a ProductionBillOfMaterial 416012 datatype. The ProductionBillOfMaterialVariantBasicData 416006 package includes a ProductionBillOfMaterial 416008 entity.

The ProductionBillOfMaterial 416008 entity has a cardinality of zero or n 416010 meaning that for each instance of the ProductionBillOfMaterialVariantBasicDataByMaterialAndPlantResponseMessage_sync 416002 entity there may be one or more ProductionBillOfMaterial 416008 entities. The ProductionBillOfMaterial 416008 entity includes various attributes, namely InternalID 416014, ID 416020, Description 416026 and Variant 416032.

The InternalID 416014 attribute is a ProductionBillOfMaterialInternalID 416018 datatype. The InternalID 416014 attribute has a cardinality of one 416016 meaning that for each instance of the ProductionBillOfMaterial 416008 entity there is one InternalID 416014 attribute.

The ID 416020 attribute is a ProductionBillOfMaterialID 416024 datatype. The ID 416020 attribute has a cardinality of zero or one 416022 meaning that for each instance of the ProductionBillOfMaterial 416008 entity there may be one ID 416020 attribute.

The Description 416026 attribute is a SHORT_Description 416030 datatype. The Description 416026 attribute has a cardinality of zero or one 416028 meaning that for each instance of the ProductionBillOfMaterial 416008 entity there may be one Description 416026 attribute.

The Variant 416032 attribute is a Variant 416036 datatype. The Variant 416032 attribute has a cardinality of one or n 416034 meaning that for each instance of the ProductionBillOfMaterial 416008 entity there are one or more Variant 416032 attributes.

The Log 416092 package is a Log 416098 datatype. The Log 416092 package includes a Log 416094 entity.

The Log 416094 entity has a cardinality of zero or one 416096 meaning that for each instance of the ProductionBillOfMaterialVariantBasicDataByMaterialAndPlantResponseMessage_sync 416002 entity there may be one Log 416094 entity.

ProductionBillOfMaterialVariantBasicData Package

The ProductionBillOfMaterialVariantBasicData package collects identifying elements of variants and key data of their corresponding bills of material.

ProductionBillOfMaterial

A ProductionBillOfMaterial is a complete and structured list that defines and describes the components that are required in the production of a material. InternalID is an identifier for the group of variants represented by a ProductionBillOfMaterial. ID (may be optional) is a ‘readable’ identifier for the group of variants represented by a ProductionBillOfMaterial. Description (may be optional) is a restriction on GDT Description to specify a uniform length for short descriptions. ProductionBillOfMaterialDescription is the short description of the group of variants represented by a ProductionBillOfMaterial Variant Variant determines exactly one composite material. MaterialInternalID is a unique identifier for a product. MaterialInternalID is the identifier for the material represented by the variant. PlantID (may be optional) refers to a structural organizational unit within a company. A plant has its own tax assignment. Plant identifies the plant, where the variant is located. ID (may be optional) is the identifier of a specific variant of a ProductionBillOfMaterial. UsageCode is the coded representation of the usage of a variant of a production bill of material. MaterialDescription is a restriction on GDT Description to specify a uniform length for short descriptions. MaterialDescription is the short description of a material. UsageName (may be optional) specifies names of a uniform length of 30 characters. ProductionBillOfMaterialVariantUsageName is the name of the usage code. Description (may be optional) is a restriction on GDT Description to specify a uniform length for short descriptions. ProductionBillOfMaterialVariantDescription is the description of a specific variant of a ProductionBillOfMaterial. ValidityPeriod (may be optional) is the period of time when the ProductionBillOfMaterial is valid. ProductionBillOfMaterialVariantActivationProfileCode (may be optional) ProductionBillOfMaterialVariantActivationProfileCode is a coded representation of the possible subsequent processing of the production bill of material in various other organizational areas (for example, engineering, costing, MRP).

Log Package

A Log package groups the messages used for user interaction.

Log

A log is a sequence of messages that result when an application executes a task.

Message Data Type

The message data type ProductionBillOfMaterialVariantItemBasicDataByVariantIdentifyingElementsQueryMessage contains the Selection included in the business document. FIGS. 417-1 through 417-2 show a ProductionBillOfMaterialVariantItemBasicDataByVariantIdentifyingElementsQueryMessage_sync 417000 package. The ProductionBillOfMaterialVariantItemBasicDataByVariantIdentifyingElementsQueryMessage_sync 417000 package is a ProductionBillOfMaterialVariantItemBasicDataByVariantIdentifyingElementsQueryMessage_sync 417004 datatype. The ProductionBillOfMaterialVariantItemBasicDataByVariantIdentifyingElementsQueryMessage_sync 417000 package includes a ProductionBillOfMaterialVariantItemBasicDataByVariantIdentifyingElementsQueryMessage_sync 417002 entity. The ProductionBillOfMaterialVariantItemBasicDataByVariantIdentifyingElementsQueryMessage_sync 417000 package includes a Selection 417006 package.

The Selection 417006 package is a ProductionBillOfMaterialVariantItemBasicDataSelectionByVariantIdentifyingElements 417012 datatype. The Selection 417006 package includes a ProductionBillOfMaterialVariantItemBasicDataSelectionByVariantIdentifyingElements 417008 entity.

The ProductionBillOfMaterialVariantItemBasicDataSelectionByVariantIdentifyingElements 417008 entity has a cardinality of one 417010 meaning that for each instance of the ProductionBillOfMaterialVariantItemBasicDataByVariantIdentifyingElementsQueryMessage_sync 417002 entity there is one ProductionBillOfMaterialVariantItemBasicDataSelectionByVariantIdentifyingElements 417008 entity. The ProductionBillOfMaterialVariantItemBasicDataSelectionByVariantIdentifyingElements 417008 entity includes various attributes, namely MaterialInternalID 417014, PlantID 417020, ProductionBillOfMaterialVariantID 417026, ValidityDate 417032 and ProductionBillOfMaterialVariantUsageCode 417038.

The MaterialInternalID 417014 attribute is a ProductInternalID 417018 datatype. The MaterialInternalID 417014 attribute has a cardinality of one 417016 meaning that for each instance of the ProductionBillOfMaterialVariantItemBasicDataSelectionByVariantIdentifyingElements 417008 entity there is one MaterialInternalID 417014 attribute.

The PlantID 417020 attribute is a PlantID 417024 datatype. The PlantID 417020 attribute has a cardinality of one 417022 meaning that for each instance of the ProductionBillOfMaterialVariantItemBasicDataSelectionByVariantIdentifyingElements 417008 entity there is one PlantID 417020 attribute.

The ProductionBillOfMaterialVariantID 417026 attribute is a ProductionBillOfMaterialVariantID 417030 datatype. The ProductionBillOfMaterialVariantID 417026 attribute has a cardinality of zero or one 417028 meaning that for each instance of the ProductionBillOfMaterialVariantItemBasicDataSelectionByVariantIdentifyingElements 417008 entity there may be one ProductionBillOfMaterialVariantID 417026 attribute.

The ValidityDate 417032 attribute is a Date 417036 datatype. The ValidityDate 417032 attribute has a cardinality of zero or one 417034 meaning that for each instance of the ProductionBillOfMaterialVariantItemBasicDataSelectionByVariantIdentifyingElements 417008 entity there may be one ValidityDate 417032 attribute.

The ProductionBillOfMaterialVariantUsageCode 417038 attribute is a ProductionBillOfMaterialVariantUsageCode 417042 datatype. The ProductionBillOfMaterialVariantUsageCode 417038 attribute has a cardinality of one 417040 meaning that for each instance of the ProductionBillOfMaterialVariantItemBasicDataSelectionByVariantIdentifyingElements 417008 entity there is one ProductionBillOfMaterialVariantUsageCode 417038 attribute.

Selection Package

The Selection package collects selection criteria for ProductionBillOfMaterialVariantItem retrieval.

ProductionBillOfMaterialVariantItemBasicDataSelectionByVariantIdentifyingElements A ProductionBillOfMaterialVariantItemBasicDataSelectionByVariantIdentifyingElements specifies a variant with a validity date (default: current date). MaterialInternalID is a unique identifier for a product. MaterialInternalID is part of the key of the variant for which items are requested. PlantID refers to a structural organizational unit within a company. A plant has its own tax assignment. Plant is part of the key of the variant for which items are requested. ProductionBillOfMaterialVariantID (may be optional) is an identifier for a variant of a ProductionBillOfMaterial. It is part of the key of the variant for which items are requested. ValidityDate (may be optional) is the specification of an exact day in the Gregorian calendar. ValidityTimePoint is a time point at which something is valid. Here ValidityDate specifies a day on which a variant has to be valid. If ValidityDate is not set, current date is assumed. ProductionBillOfMaterialVariantUsageCode is the coded representation of the usage of a variant of a production bill of material. It is part of the key of the variant for which items are requested.

Message Data Type

The message data type ProductionBillMaterialVariantItemBasicDataByVariantIdentifyingElementsResponseMessage_sync 408012 of FIG. 412 contains the ProductionBillOfMaterial included in the business document and the business information that is relevant for sending information, warning or error messages when processing operations for the Document. The message data type 408012 includes entity ProductionBillOfMaterialVariantItemBasicDataByVariantIdentifyingElementsResponseMessage_sync 412004 and packages ProductionBillOfMaterial 412006 and Log 412014.

ProductionBillOfMaterial Package

ProductionBillOfMaterial package 412006 collects all items of a variant of a bill of material resulting from a ProductionBillOfMaterialVariantItemBasicDataByVariantIdentifyingElementsQuery_sync. ProductionBillOfMaterial package 412006 includes entities ProductionBillOfMaterial 412008, Variant 412010 and Item 412012.

ProductionBillOfMaterial

ProductionBillOfMaterial entity 412008 is a complete and structured list that defines and describes the components that are required in the production of a material. InternalID is an identifier for the group of variants represented by a ProductionBillOfMaterial. ID (may be optional) is "readable" identifier for the group of variants represented by a ProductionBillOfMaterial. Description (may be optional) is a restriction on GDT Description to specify a uniform length for short descriptions. ProductionBillOfMaterialDescription is the short description of the group of variants represented by a ProductionBillOfMaterial.

Variant

Variant entity 412010 determines exactly one composite material. MaterialInternalID is a unique identifier for a product. MaterialInternalID is the identifier for the material represented by the variant. PlantID (may be optional) refers to a structural organizational unit within a company. A plant has its own tax assignment. Plant identifies the plant, where the variant is located. ID (may be optional) is an identifier for a variant of a ProductionBillOfMaterial. ValidityDate is the specification of an exact day in the Gregorian calendar. ValidityTimePoint is a time point at which something is valid. Here ValidityDate specifies a day on which the variant is valid. UsageCode is the coded representation of the usage of a variant of a production bill of material. UsageName specifies names of a uniform length of 30 characters. ProductionBillOfMaterialVariantUsageName is the name of the usage code. MaterialDescription is a restriction on GDT Description to specify a uniform length for short descriptions. MaterialDescription is the short description of a material. Description (may be optional) is a restriction on GDT Description to specify a uniform length for short descriptions. ProductionBillOfMaterialVariantDescription is the description of a specific variant of a ProductionBillOfMaterial.

Item

Item entity 412012 is a component of a variant. ID is an identifier for an item of a ProductionBillOfMaterial. MaterialInternalID is a unique identifier for a product. MaterialInternalID is the identifier for the material represented by the item. OriginItemID is an identifier for an item of a ProductionBillOfMaterial. OriginItemID is the identifier of the item from which the change state series of this item started. StartEngineeringChangeOrderID (may be optional) is a unique identifier for an engineering change order. Here StartEngineeringChangeOrderID holds the ID of the EngineeringChangeOrder with which the Item was started. EndEngineeringChangeOrderID (may be optional) is a unique identifier for an engineering change order. Here EndEngineeringChangeOrderID holds the ID of the EngineeringChangeOrder with which the Item was completed. ValidityPeriod is a period that is defined by two points in time. These points in time are expressed in calendar days. UPPEROPEN_DatePeriod includes the start time-point, but excludes the end time-point. ValidityDatePeriod holds the day from which on the Item is valid and the day from which on the Item is no longer valid. LogisticsItemTypeCode is the coded representation of a type of an item of a listing within Logistics. Here it categorizes material items within a ProductionBillOfMaterial as those which are kept in stock or those which are not. LogisticsItemIndexText is a string which makes it possible to group, sort or number the items of a listing within Logistics. DesiredQuantity is the quantity required or desired. Here RequiredQuantity means the required quantity for the item within this variant. QuantityFixedIndicator is used for binary classifications, indicators, flags etc. A FixedIndicator indicates whether a value/object is fixed or not. Here QuantityFixedIndicator indicates whether the item's quantity is fixed within the variant. MaterialDescription is a restriction on GDT Description to specify a uniform length for short descriptions. MaterialDescription is the short description of a material. Description (may be optional) is a restriction on GDT Description to specify a uniform length for short descriptions. ProductionBillOfMaterialItemDescription is the description of an Item. LogisticsItemTypeName specifies names of a uniform length of 30 characters. LogisticsItemTypeName is the name of the LogisticsItemTypeCode.

Log Package

Log package 412014 groups the messages used for user interaction. Log package 412014 contains Log entity 412016.

Log

Log entity 412016 is a sequence of messages that result when an application executes a task.

Message Data Type

The message data type ProductionBillOfMaterialVariantItemByVariantIdentifyingElementsQueryMessage_sync 408014 of FIG. 413 contains the Selection included in the business document. The message data type 408014 contains entity ProductionBillOfMaterialVariantItemByVariantIdentifyingElementsQueryMessage_sync 413004 and package Selection 413006.

Selection Package

The Selection package 413006 collects selection criteria for ProductionBillOfMaterialVariantItem retrieval. The Selection package 413006 includes a ProductionBillOfMaterialVariantItemSelectionByVariantIdentifyingElements entity 413008.

ProductionBillOfMaterialVariantItemSelectionByVariantIdentifyingElements

The ProductionBillOfMaterialVariantItemSelectionByVariantIdentifyingElements entity 413008 specifies a variant with a validity date (default: current date). MaterialInternalID is a unique identifier for a product. MaterialInternalID is part of the key of the variant for which items are requested. PlantID is a structural organizational unit within a company. A plant has its own tax assignment. Plant is part of the key of the variant for which items are requested. ProductionBillOfMaterialVariantID (may be optional) is an identifier for a variant of a ProductionBillOfMaterial. It is part of the key of the variant for which items are requested. ValidityDate (may be optional) is the specification of an exact day in the Gregorian Calendar. ValidityTimePoint is a time point at which something is valid. Here ValidityDate specifies a day on which a variant has to be valid. If ValidityDate is not set, current date is assumed. ProductionBillOfMaterialVariantUsageCode is the coded representation of the usage of a variant of a production bill of material. It is part of the key of the variant for which items are requested.

Message Data Type

The message data type ProductionBillOfMaterialVariantItemByVariantIdentifyingElementsResponseMessage_sync contains the ProductionBillOfMaterial included in the business document and the business information that is relevant for sending information, warning or error messages when processing operations for the Document. FIGS. 418-1 through 418-10 show a ProductionBillOfMaterialVariantItemBasicDataByVariantIdentifyingElementsResponseMessage_sync 418000 package. The ProductionBillOfMaterialVariantItemBasicDataByVariantIdentifyingElementsResponseMessage_sync 418000 package is a ProductionBillOfMaterialItemBasicDataByVariantIdentifyingElementsResponseMessage_sync 418004 datatype. The ProductionBillOfMaterialVariantItemBasicDataByVariantIdentifyingElementsResponseMessage_sync 418000 package includes a ProductionBillOfMaterialVariantItemBasicDataByVariantIdentifyingElementsResponseMessage_sync 418002 entity. The ProductionBillOfMaterialVariantItemBasicDataByVariantIdentifyingElementsResponseMessage_sync 418000 package includes various packages, namely ProductionBillOfMaterial 418006 and Log 4180254.

The ProductionBillOfMaterial 418006 package is a ProductionBillOfMaterial 418012 datatype. The ProductionBillOfMaterial 418006 package includes a ProductionBillOfMaterial 418008 entity.

The ProductionBillOfMaterial 418008 entity has a cardinality of zero or one 418010 meaning that for each instance of the ProductionBillOfMaterialVariantItemBasicDataByVariantIdentifyingElementsResponseMessage_sync 418002 entity there may be one ProductionBillOfMaterial 418008 entity.

The ProductionBillOfMaterial 418008 entity includes various attributes, namely InternalID 418014, ID 418020, Description 418026 and Variant 418032.

The InternalID 418014 attribute is a ProductionBillOfMaterialInternalID 418018 datatype. The InternalID 418014 attribute has a cardinality of one 418016 meaning that for each instance of the ProductionBillOfMaterial 418008 entity there is one InternalID 418014 attribute.

The ID 418020 attribute is a ProductionBillOfMaterialID 418024 datatype. The ID 418020 attribute has a cardinality of zero or one 418022 meaning that for each instance of the ProductionBillOfMaterial 418008 entity there may be one ID 418020 attribute.

The Description 418026 attribute is a SHORT_Description 418030 datatype. The Description 418026 attribute has a cardinality of zero or one 418028 meaning that for each instance of the ProductionBillOfMaterial 418008 entity there may be one Description 418026 attribute.

The Variant 418032 attribute is a Variant 418036 datatype. The Variant 418032 attribute has a cardinality of one 418034 meaning that for each instance of the ProductionBillOfMaterial 418008 entity there is one Variant 418032 attribute.

The Log 4180254 package is a Log 4180260 datatype. The Log 4180254 package includes a Log 4180256 entity.

The Log 4180256 entity has a cardinality of zero or one 4180258 meaning that for each instance of the ProductionBillOfMaterialVariantItemBasicDataByVariantIdentifyingElementsResponseMessage_sync 418002 entity there may be one Log 4180256 entity.

ProductionBillOfMaterial Package

The ProductionBillOfMaterial package collects all items of a variant of a bill of material resulting from a ProductionBillOfMaterialVariantItemByVariantIdentifyingElementsQuery_sync.

ProductionBillOfMaterial

A ProductionBillOfMaterial is a complete and structured list that defines and describes the components that are required in the production of a material. InternalID is an identifier for the group of variants represented by a ProductionBillOfMaterial. ID (may be optional) is a 'readable' identifier for the group of variants represented by a ProductionBillOfMaterial. Description (may be optional) is a restriction on GDT Description to specify a uniform length for short descriptions. ProductionBillOfMaterialDescription is the short description of the group of variants represented by a ProductionBillOfMaterial.

Variant

Variant determines exactly one composite material. MaterialInternalID is a unique identifier for a product. MaterialInternalID is the identifier for the material represented by the variant. PlantID (may be optional) is a structural organizational unit within a company. A plant has its own tax assignment. Plant identifies the plant, where the variant is located. ID (may be optional) is an identifier for a variant of a ProductionBillOfMaterial. BaseQuantity (may be optional) is the quantity to which all component quantities in a production bill of material relate. ValidityDate is the specification of an exact day in the Gregorian calendar. ValidityTimePoint is a time point at which something is valid. Here ValidityDate specifies a day on which the variant is valid. UsageCode is the coded representation of the usage of a variant of a production bill of material. UsageName specifies names of a uniform length of 30 characters. ProductionBillOfMaterialVariantUsageName is the name of the usage code. MaterialDescription is a restriction on GDT Description to specify a uniform length for short descriptions. MaterialDescription is the short description of a material. Description (may be optional) is a restriction on GDT Description to specify a uniform length for short descriptions. ProductionBillOfMaterialVariantDescription is the description of a specific variant of a ProductionBillOfMaterial.

Item

Item is a component of a variant. ID is an identifier for an item of a ProductionBillOfMaterial. MaterialInternalID is a unique identifier for a product. MaterialInternalID is the identifier for the material represented by the item. OriginItemID is an identifier for an item of a ProductionBillOfMaterial. OriginItemID is the identifier of the item from which the change state series of this item started. SubItemExistsIndicator (may be optional) indicates whether a subitem exists or not.StartEngineeringChangeOrderID (may be optional) is a unique identifier for an engineering change order. Here StartEngineeringChangeOrderID holds the ID of the EngineeringChangeOrder with which the Item was created.EndEngineeringChangeOrderID (may be optional) is a unique identifier for an engineering change order. Here EndEngineeringChangeOrderID holds the ID of the EngineeringChangeOrder with which the Item was deleted. ValidityDatePeriod is a period that is defined by two points in time. These points in time are expressed in calendar days. UPPEROPEN_DatePeriod includes the start time-point, but excludes the end time-point. ValidityDatePeriod holds the day from which on the Item is valid and the day from which on the Item is no longer valid. LogisticsItemTypeCode is the coded representation of a type of an item of a listing within Logistics. Here it categorizes material items within a ProductionBillOfMaterial as those which are kept in stock or those which are not. LogisticsItemIndexText is a string which makes it possible to group, sort or number the items of a listing within Logistics. DesiredQuantity is the quantity required or desired. Here RequiredQuantity means the required quantity for the item within this variant. QuantityFixedIndicator is used for binary classifications, indicators, flags etc. A FixedIndicator indicates whether a value/object is fixed or not. Here QuantityFixedIndicator indicates whether the item's quantity is fixed within the variant. MaterialDescription is a restriction on GDT Description to specify a uniform length for short descriptions. MaterialDescription is the short description of a material. Description (may be optional) is a restriction on GDT Description to specify a uniform length for short descriptions. ProductionBillOfMaterialItemDescription is the description of an Item. AdditionalDescription (may be optional) is a restriction on GDT Description to specify a uniform length for short descriptions. ProductionBillOfMaterialItemAdditionalDescription is the additional description of an Item.OperationScrapPercent (may be optional) is the percentage of the material processed in an operation that does not meet quality requirements. ComponentScrapPercent (may be optional) is the scrap of a component that is expected to occur when a material is used in production. MaterialRoleCode (may be optional) is the code indicating the role of a material. MaterialRoleCode=2 indicates that the item is a co-product. PhantomAssemblyIndicator (may be optional) indicates whether the item is a phantom assembly or not. ItemToProductionRelevanceIndicator (may be optional) indicates whether the item is relevant to the production process or not. MaterialProvidedIndicator indicates whether the material is provided or not. BackflushIndicator (may be optional) indicates whether the item is back flushed or not. BulkMaterialIndicator (may be optional) indicates whether the item is defined as a bulk material or not, which is available directly at the work center (for example, washers or grease). BulkMaterialMasterRecordIndicator (may be optional) indicates whether the material is defined in the material master record (in the plant where the production bill of material is maintained) as a bulk material or not. IssueLocationID (may be optional) is a unique identifier of the issue location from which the material is issued during the production process. SupplyAreaLocationName (may be optional) is the name of the supply area, which is used for material replenishment purposes and is situated directly on the shop floor. LogisticsItemTypeName specifies names of a uniform length of 30 characters. LogisticsItemTypeName is the name of the LogisticsItemTypeCode.

Log Package

A Log package groups the messages used for user interaction.

Log

A log is a sequence of messages that result when an application executes a task.

ProductionConfirmation Interface

A company wants its production workers to confirm their productivity. This includes the confirmation of quantities of intermediate or finished goods, the confirmation of different activities (e.g. setup and teardown efforts, power consumption, machine times, etc.), processing times, as well as the goods movements of the consumed and produced materials altogether with respect to the corresponding production orders.

Message Choreography

The message choreography of FIG. 419 describes a possible logical sequence of messages that can be used to realize a production confirmation business scenario. A ProductionConfirmationCreateRequest is a request to Production for creating a production confirmation. It contains information about the produced and consumed goods, working times and work quantities to be confirmed. The structure of the message type ProductionConfirmationCreateRequest is specified by the message data type ProductionConfirmationCreateRequestMessage. Message Type ProductionConfirmationCreateRequest can be used either synchronously (ProductionConfirmationCreateRequest_sync) or asynchronously.

A ProductionConfirmationCreateConfirmation is the confirmation to a ProductionConfirmationRequest. The structure of the message type ProductionConfirmationCreateConfirmation is specified by the message data type ProductionConfirmationCreateConfirmationMessage. Message Type ProductionConfirmationCreateConfirmation can be used either synchronously (ProductionConfirmationCreateConfirmation_sync) or asynchronously.

A ProductionConfirmationCancelRequest_sync is a request to Production for canceling a production confirmation. The structure of the message type ProductionConfirmationCancelRequest_sync is specified by the message data type ProductionConfirmationCancelRequestMessage_sync. Message Type ProductionConfirmationCancelRequest can be used synchronously (ProductionConfirmationCancelRequest_sync) only.

A ProductionConfirmationCancelConfirmation_sync is the confirmation to a ProductionConfirmationCancelRequest. The structure of the message type ProductionConfirmationCancelConfirmation_sync is specified by the message data type ProductionConfirmationCancelConfirmationMessage_sync. Message Type ProductionConfirmationCancelConfirmation can be used synchronously (ProductionConfirmationCancelConfirmation_sync) only.

For example, a "Manufacturing Execution" system 419000 can request to create a production confirmation using the ProductionConfirmationCreateRequest message 419004 as shown, for example, in FIG. 423. A "Production" system 419002 can confirm the creation request using the ProductionConfirmationCreateConfirmation message 419006 as shown, for example, in FIG. 422. The "Manufacturing Execution" system 419000 can request to cancel a production confirmation using the ProductionConfirmationCancelRequest_sync message 419008 as shown, for example, in FIG. 421. The "Production" system 419002 can confirm the creation request using the ProductionConfirmationCancelConfirmation_sync message 419010 as shown, for example, in FIG. 420. The messages ProductionConfirmationCreateRequest 419004 and ProductionConfirmation CreateConfirmation 419006 can be used either synchronously or asynchronously. In some implementations, the messages ProductionConfirmationCancelRequest 419008 and ProductionConfirmationCancelConfirmation 419010 may be used synchronously only.

Message Data Type

The message data type ProductionConfirmationCreateRequestMessage contains the Production Confirmation information included in the business document and the business information that is relevant for sending a business document in a message.

FIGS. 428-1 through 428-16 show a ProductionConfirmationCreateRequestMessage 42800 package. The ProductionConfirmationCreateRequestMessage 42800 package is a ProductionConfirmationCreateRequestMessage 42804 datatype. The ProductionConfirmationCreateRequestMessage 42800 package includes a ProductionConfirmationCreateRequestMessage 42802 entity. The ProductionConfirmationCreateRequestMessage 42800 package includes packages: MessageHeader 42806 and ProductionConfirmation 42814.

The MessageHeader 42806 package is a BasicBusinessDocumentMessageHeader 42812 datatype. The MessageHeader 42806 package includes a MessageHeader 42808 entity.

The MessageHeader 42808 entity has a cardinality of 1 42810. Particularly, for each instance of the ProductionConfirmationCreateRequestMessage 42802 entity there is one MessageHeader 42808 entity.

The ProductionConfirmation 42814 package includes a ProductionConfirmation 42816 entity. The ProductionConfirmation 42814 package includes a GoodsMovementInformation 428278 package.

The ProductionConfirmation 42816 entity has a cardinality of 1 42818. Particularly, for each instance of the ProductionConfirmationCreateRequestMessage 42802 entity there is one ProductionConfirmation 42816 entity. The ProductionConfirmation 42816 entity includes attributes: GroupID 42820, ExternalSystemConfirmationID 42826, ProductionOrderID 42832, ProductionOrderSequenceID 42838, ProductionOrderOperationID 42844, PlantID 42850, WorkCentreID 42856, CapacitySplitID 42862, ExternalSystemUserAccountID 42868, EmployeeID 42874, EmployeeTimeRecordingCardID 42880, CompensationComponentTypeID 42886, CompensationComponentTypeGroupID 42892, RecordTypeCode 42898, PostingDate 428104, OpenReservationCompletedIndicator 428110, CapacityCategoryCode 428116, EmployeeSuitabilityCode 428122, EmployeeNumberValue 428128, ExternalSystemCreationDateTime 428134, ExecutionDateTimePeriod 428140, SetupDateTimePeriod 428146, ProcessingDateTimePeriod 428152, TeardownDateTimePeriod 428158, FirstWorkQuantity 428164, FirstWorkQuantityCompletedIndicator 428170, SecondWorkQuantity 428176, SecondWorkQuantityCompletedIndicator 428182, Third- WorkQuantity 428188, ThirdWorkQuantityCompletedIndicator 428194, FourthWorkQuantity 428200, FourthWorkQuantityCompletedIndicator 428206, FifthWorkQuantity 428212, FifthWorkQuantityCompletedIndicator 428218, SixthWorkQuantity 428224, SixthWorkQuantityCompletedIndicator 428230, BusinessProcessWorkQuantity 428236, BusinessProcessWorkQuantityCompletedIndicator 428242, ConfirmQuantity 428248, ScrapQuantity 428254, ReworkQuantity 428260, LogisticsDeviationReasonCode 428266 and Description 428272.

The GroupID 42820 attribute is a ProductionConfirmationGroupID 42824 datatype. The GroupID 42820 attribute has a cardinality of zero to one 42822. Particularly, for each instance of the ProductionConfirmation 42816 entity there may be one GroupID 42820 attribute.

The ExternalSystemConfirmationID 42826 attribute is a ProductionConfirmationExternalSystemConfirmationID 42830 datatype. The ExternalSystemConfirmationID 42826 attribute has a cardinality of zero or one 42828. Particularly, for each instance of the ProductionConfirmation 42816 entity there may be one ExternalSystemConfirmationID 42826 attribute.

The ProductionOrderID 42832 attribute is a ProductionOrderID 42836 datatype. The ProductionOrderID 42832 attribute has a cardinality of zero or one 42834. Particularly, for each instance of the ProductionConfirmation 42816 entity there may be one ProductionOrderID 42832 attribute.

The ProductionOrderSequenceID 42838 attribute is a ProductionOrderSequenceID 42842 datatype. The ProductionOrderSequenceID 42838 attribute has a cardinality of zero or one 42840. Particularly, for each instance of the ProductionConfirmation 42816 entity there may be one ProductionOrderSequenceID 42838 attribute.

The ProductionOrderOperationID 42844 attribute is an OperationID 42848 datatype. The ProductionOrderOperationID 42844 attribute has a cardinality of 0 . . . 1 42846. Particularly, for each instance of the ProductionConfirmation 42816 entity there may be one ProductionOrderOperationID 42844 attribute.

The PlantID 42850 attribute is a PlantID 42854 datatype. The PlantID 42850 attribute has a cardinality of 0 . . . 1 42852. Particularly, for each instance of the ProductionConfirmation 42816 entity there may be one PlantID 42850 attribute.

The WorkCentreID 42856 attribute is a WorkCentreID 42860 datatype. The WorkCentreID 42856 attribute has a cardinality of 0 . . . 1 42858. Particularly, for each instance of the ProductionConfirmation 42816 entity there may be one WorkCentreID 42856 attribute.

The CapacitySplitID 42862 attribute is a CapacitySplitID 42866 datatype. The CapacitySplitID 42862 attribute has a cardinality of 0 . . . 1 42864. Particularly, for each instance of the ProductionConfirmation 42816 entity there may be one CapacitySplitID 42862 attribute.

The ExternalSystemUserAccountID 42868 attribute is an UserAccountID 42872 datatype. The ExternalSystemUserAccountID 42868 attribute has a cardinality of 0 . . . 1 42870. Particularly, for each instance of the ProductionConfirmation 42816 entity there may be one ExternalSystemUserAccountID 42868 attribute.

The EmployeeID 42874 attribute is an EmployeeID 42878 datatype. The EmployeeID 42874 attribute has a cardinality of 0 . . . 1 42876. Particularly, for each instance of the ProductionConfirmation 42816 entity there may be one EmployeeID 42874 attribute.

The EmployeeTimeRecordingCardID 42880 attribute is an EmployeeTimeRecordingCardID 42884 datatype. The EmployeeTimeRecordingCardID 42880 attribute has a cardinality of 0 . . . 1 42882. Particularly, for each instance of the ProductionConfirmation 42816 entity there may be one EmployeeTimeRecordingCardID 42880 attribute.

The CompensationComponentTypeID 42886 attribute is a CompensationComponentTypeID 42890 datatype. The CompensationComponentTypeID 42886 attribute has a cardinality of 0 . . . 1 42888. Particularly, for each instance of the ProductionConfirmation 42816 entity there may be one CompensationComponentTypeID 42886 attribute.

The CompensationComponentTypeGroupID 42892 attribute is a CompensationComponentTypeGroupID 42896 datatype. The CompensationComponentTypeGroupID 42892 attribute has a cardinality of 0 . . . 1 42894. Particularly, for each instance of the ProductionConfirmation 42816 entity there may be one CompensationComponentTypeGroupID 42892 attribute.

The RecordTypeCode 42898 attribute is a ProductionConfirmationRecordTypeCode 428102 datatype. The RecordTypeCode 42898 attribute has a cardinality of 1 428100. Particularly, for each instance of the ProductionConfirmation 42816 entity there is one RecordTypeCode 42898 attribute.

The PostingDate 428104 attribute is a Date 428108 datatype. The PostingDate 428104 attribute has a cardinality of 0 . . . 1 428106. Particularly, for each instance of the ProductionConfirmation 42816 entity there may be one PostingDate 428104 attribute.

The OpenReservationCompletedIndicator 428110 attribute is an Indicator 428114 datatype. The OpenReservationCompletedIndicator 428110 attribute has a cardinality of 0 . . . 1 428112. Particularly, for each instance of the ProductionConfirmation 42816 entity there may be one OpenReservationCompletedIndicator 428110 attribute.

The CapacityCategoryCode 428116 attribute is a CapacityCategoryCode 428120 datatype. The CapacityCategoryCode 428116 attribute has a cardinality of 0 . . . 1 428118. Particularly, for each instance of the ProductionConfirmation 42816 entity there may be one CapacityCategoryCode 428116 attribute.

The EmployeeSuitabilityCode 428122 attribute is an EmployeeSuitabilityCode 428126 datatype. The EmployeeSuitabilityCode 428122 attribute has a cardinality of 0 . . . 1 428124. Particularly, for each instance of the ProductionConfirmation 42816 entity there may be one EmployeeSuitabilityCode 428122 attribute.

The EmployeeNumberValue 428128 attribute is a NumberValue 428132 datatype. The EmployeeNumberValue 428128 attribute has a cardinality of 0 . . . 1 428130. Particularly, for each instance of the ProductionConfirmation 42816 entity there may be one EmployeeNumberValue 428128 attribute.

The ExternalSystemCreationDateTime 428134 attribute is a DateTime 428138 datatype. The ExternalSystemCreationDateTime 428134 attribute has a cardinality of 0 . . . 1 428136. Particularly, for each instance of the ProductionConfirmation 42816 entity there may be one ExternalSystemCreationDateTime 428134 attribute.

The ExecutionDateTimePeriod 428140 attribute is an UPPEROPEN_LOCAL_DateTimePeriod 428144 datatype. The ExecutionDateTimePeriod 428140 attribute has a cardinality of 0 . . . 1 428142. Particularly, for each instance of the ProductionConfirmation 42816 entity there may be one ExecutionDateTimePeriod 428140 attribute.

The SetupDateTimePeriod 428146 attribute is an UPPEROPEN_LOCAL_DateTimePeriod 428150 datatype. The SetupDateTimePeriod 428146 attribute has a cardinality of 0 . . . 1 428148. Particularly, for each instance of the ProductionConfirmation 42816 entity there may be one SetupDateTimePeriod 428146 attribute.

The ProcessingDateTimePeriod 428152 attribute is an UPPEROPEN_LOCAL_DateTimePeriod 428156 datatype. The ProcessingDateTimePeriod 428152 attribute has a cardinality of 0 . . . 1 428154. Particularly, for each instance of the ProductionConfirmation 42816 entity there may be one ProcessingDateTimePeriod 428152 attribute.

The TeardownDateTimePeriod 428158 attribute is an UPPEROPEN_LOCAL_DateTimePeriod 428162 datatype. The TeardownDateTimePeriod 428158 attribute has a cardinality of 0 . . . 1 428160. Particularly, for each instance of the ProductionConfirmation 42816 entity there may be one TeardownDateTimePeriod 428158 attribute.

The FirstWorkQuantity 428164 attribute is a Quantity 428168 datatype. The FirstWorkQuantity 428164 attribute has a cardinality of 0 . . . 1 428166. Particularly, for each instance of the ProductionConfirmation 42816 entity there may be one FirstWorkQuantity 428164 attribute.

The FirstWorkQuantityCompletedIndicator 428170 attribute is an Indicator 428174 datatype. The FirstWorkQuantityCompletedIndicator 428170 attribute has a cardinality of 0 . . . 1 428172. Particularly, for each instance of the ProductionConfirmation 42816 entity there may be one FirstWorkQuantityCompletedIndicator 428170 attribute.

The SecondWorkQuantity 428176 attribute is a Quantity 428180 datatype. The SecondWorkQuantity 428176 attribute has a cardinality of 0 . . . 1 428178. Particularly, for each instance of the ProductionConfirmation 42816 entity there may be one SecondWorkQuantity 428176 attribute.

The SecondWorkQuantityCompletedIndicator 428182 attribute is an Indicator 428186 datatype. The SecondWorkQuantityCompletedIndicator 428182 attribute has a cardinality of 0 . . . 1 428184. Particularly, for each instance of the ProductionConfirmation 42816 entity there may be one SecondWorkQuantityCompletedIndicator 428182 attribute.

The ThirdWorkQuantity 428188 attribute is a Quantity 428192 datatype. The ThirdWorkQuantity 428188 attribute has a cardinality of 0 . . . 1 428190. Particularly, for each instance of the ProductionConfirmation 42816 entity there may be one ThirdWorkQuantity 428188 attribute.

The ThirdWorkQuantityCompletedIndicator 428194 attribute is an Indicator 428198 datatype. The ThirdWorkQuantityCompletedIndicator 428194 attribute has a cardinality of 0 . . . 1 428196. Particularly, for each instance of the ProductionConfirmation 42816 entity there may be one ThirdWorkQuantityCompletedIndicator 428194 attribute.

The FourthWorkQuantity 428200 attribute is a Quantity 428204 datatype. The FourthWorkQuantity 428200 attribute has a cardinality of 0 . . . 1 428202. Particularly, for each instance of the ProductionConfirmation 42816 entity there may be one FourthWorkQuantity 428200 attribute.

The FourthWorkQuantityCompletedIndicator 428206 attribute is an Indicator 428210 datatype. The FourthWorkQuantityCompletedIndicator 428206 attribute has a cardinality of 0 . . . 1 428208. Particularly, for each instance of the ProductionConfirmation 42816 entity there may be one FourthWorkQuantityCompletedIndicator 428206 attribute.

The FifthWorkQuantity 428212 attribute is a Quantity 428216 datatype. The FifthWorkQuantity 428212 attribute has a cardinality of 0 . . . 1 428214. Particularly, for each instance of the ProductionConfirmation 42816 entity there may be one FifthWorkQuantity 428212 attribute.

The FifthWorkQuantityCompletedIndicator 428218 attribute is an Indicator 428222 datatype. The FifthWorkQuantityCompletedIndicator 428218 attribute has a cardinality of 0 . . . 1 428220. Particularly, for each instance of the ProductionConfirmation 42816 entity there may be one FifthWorkQuantityCompletedIndicator 428218 attribute.

The SixthWorkQuantity 428224 attribute is a Quantity 428228 datatype. The SixthWorkQuantity 428224 attribute has a cardinality of 0 . . . 1 428226. Particularly, for each instance of the ProductionConfirmation 42816 entity there may be one SixthWorkQuantity 428224 attribute.

The SixthWorkQuantityCompletedIndicator 428230 attribute is an Indicator 428234 datatype. The SixthWorkQuantityCompletedIndicator 428230 attribute has a cardinality of 0 . . . 1 428232. Particularly, for each instance of the ProductionConfirmation 42816 entity there may be one SixthWorkQuantityCompletedIndicator 428230 attribute.

The BusinessProcessWorkQuantity 428236 attribute is a Quantity 428240 datatype. The BusinessProcessWorkQuantity 428236 attribute has a cardinality of 0 . . . 1 428238. Particularly, for each instance of the ProductionConfirmation 42816 entity there may be one BusinessProcessWorkQuantity 428236 attribute.

The BusinessProcessWorkQuantityCompletedIndicator 428242 attribute is an Indicator 428246 datatype. The BusinessProcessWorkQuantityCompletedIndicator 428242 attribute has a cardinality of 0 . . . 1 428244. Particularly, for each instance of the ProductionConfirmation 42816 entity there may be one BusinessProcessWorkQuantityCompletedIndicator 428242 attribute.

The ConfirmQuantity 428248 attribute is a Quantity 428252 datatype. The ConfirmQuantity 428248 attribute has a cardinality of 0 . . . 1 428250. Particularly, for each instance of the ProductionConfirmation 42816 entity there may be one ConfirmQuantity 428248 attribute.

The ScrapQuantity 428254 attribute is a Quantity 428258 datatype. The ScrapQuantity 428254 attribute has a cardinality of 0 . . . 1 428256. Particularly, for each instance of the ProductionConfirmation 42816 entity there may be one ScrapQuantity 428254 attribute.

The ReworkQuantity 428260 attribute is a Quantity 428264 datatype. The ReworkQuantity 428260 attribute has a cardinality of 0 . . . 1 428262. Particularly, for each instance of the ProductionConfirmation 42816 entity there may be one ReworkQuantity 428260 attribute.

The LogisticsDeviationReasonCode 428266 attribute is a LogisticsDeviationReasonCode 428270 datatype. The LogisticsDeviationReasonCode 428266 attribute has a cardinality of 0 . . . 1 428268. Particularly, for each instance of the ProductionConfirmation 42816 entity there may be one LogisticsDeviationReasonCode 428266 attribute.

The Description 428272 attribute is a ProductionConfirmationDescription 428276 datatype. The Description 428272 attribute has a cardinality of 0 . . . 1 428274. Particularly, for each instance of the ProductionConfirmation 42816 entity there may be one Description 428272 attribute.

The GoodsMovementInformation 428278 package includes a GoodsMovementInformation 428280 entity. The GoodsMovementInformation 428280 entity has a cardinality of 0 . . . n 428282. Particularly, for each instance of the ProductionConfirmation 42816 entity there may be one or more GoodsMovementInformation 428280 entities.

The GoodsMovementInformation 428280 entity includes attributes: MaterialInternalID 428284, PlantID 428290, InventoryManagedLocationInternalID 428296, BatchID 428302, ConsignmentStockVendorID 428308, ConsignmentStockCustomerID 428314, SalesOrderID 428320, SalesOrderItemID 428326, ProductionOrderID 428332, ProductionOrderItemID 428338, ProductionOrderOperationID 428344, ReservationID 428350, ReservationItemID 428356, ProjectWorkBreakdownStructureElementID 428362, GoodsMovementTypeCode 428368, InventoryUsabilityCode 428374, InventorySpecialStockTypeCode 428380, InventoryValuationTypeCode 428386, InputQuantity 428392, DeliveryCompletedIndicator 428398, WithdrawnCompletedIndicator 428404, GoodsMovementItemDescription 428410, GoodsRecipientName 428416, UnloadingPointName 428422, GoodsMovementReferenceDocumentTypeCode 428428, GoodsMovementReasonCode 428434, BatchExpirationDate 428440 and BatchProductionDate 428446.

The MaterialInternalID 428284 attribute is a ProductInternalID 428288 datatype. The MaterialInternalID 428284 attribute has a cardinality of 1 428286. Particularly, for each instance of the GoodsMovementInformation 428280 entity there is one MaterialInternalID 428284 attribute.

The PlantID 428290 attribute is a PlantID 428294 datatype. The PlantID 428290 attribute has a cardinality of 1 428292. Particularly, for each instance of the GoodsMovementInformation 428280 entity there is one PlantID 428290 attribute.

The InventoryManagedLocationInternalID 428296 attribute is a LocationInternalID 428300 datatype. The InventoryManagedLocationInternalID 428296 attribute has a cardinality of 0 . . . 1 428298. Particularly, for each instance of the GoodsMovementInformation 428280 entity there may be one InventoryManagedLocationInternalID 428296 attribute.

The BatchID 428302 attribute is a BatchID 428306 datatype. The BatchID 428302 attribute has a cardinality of 0 . . . 1 428304. Particularly, for each instance of the GoodsMovementInformation 428280 entity there may be one BatchID 428302 attribute.

The ConsignmentStockVendorID 428308 attribute is a PartyInternalID 428312 datatype. The ConsignmentStockVendorID 428308 attribute has a cardinality of 0 . . . 1 428310. Particularly, for each instance of the GoodsMovementInformation 428280 entity there may be one ConsignmentStockVendorID 428308 attribute.

The ConsignmentStockCustomerID 428314 attribute is a BusinessPartnerID 428318 datatype. The ConsignmentStockCustomerID 428314 attribute has a cardinality of 0 . . . 1 428316. Particularly, for each instance of the GoodsMovementInformation 428280 entity there may be one ConsignmentStockCustomerID 428314 attribute.

The SalesOrderID 428320 attribute is a SalesOrderID 428324 datatype. The SalesOrderID 428320 attribute has a cardinality of 0 . . . 1 428322. Particularly, for each instance of the GoodsMovementInformation 428280 entity there may be one SalesOrderID 428320 attribute.

The SalesOrderItemID 428326 attribute is a SalesOrderItemID 428330 datatype. The SalesOrderItemID 428326 attribute has a cardinality of 0 . . . 1 428328. Particularly, for each instance of the GoodsMovementInformation 428280 entity there may be one SalesOrderItemID 428326 attribute.

The ProductionOrderID 428332 attribute is a ProductionOrderID 428336 datatype. The ProductionOrderID 428332 attribute has a cardinality of 1 428334. Particularly, for each instance of the GoodsMovementInformation 428280 entity there is one ProductionOrderID 428332 attribute.

The ProductionOrderItemID 428338 attribute is a ProductionOrderItemID 428342 datatype. The ProductionOrderItemID 428338 attribute has a cardinality of 0 . . . 1 428340. Particularly, for each instance of the GoodsMovementInformation 428280 entity there may be one ProductionOrderItemID 428338 attribute.

The ProductionOrderOperationID 428344 attribute is an OperationID 428348 datatype. The ProductionOrderOperationID 428344 attribute has a cardinality of 0 . . . 1 428346. Particularly, for each instance of the GoodsMovementInformation 428280 entity there may be one ProductionOrderOperationID 428344 attribute.

The ReservationID 428350 attribute is a ReservationID 428354 datatype. The ReservationID 428350 attribute has a cardinality of 0 . . . 1 428352. Particularly, for each instance of the GoodsMovementInformation 428280 entity there may be one ReservationID 428350 attribute.

The ReservationItemID 428356 attribute is a ReservationItemID 428360 datatype. The ReservationItemID 428356 attribute has a cardinality of 0 . . . 1 428358. Particularly, for each instance of the GoodsMovementInformation 428280 entity there may be one ReservationItemID 428356 attribute.

The ProjectWorkBreakdownStructureElementID 428362 attribute is a ProjectWorkBreakdownStructureElementID 428366 datatype. The ProjectWorkBreakdownStructureElementID 428362 attribute has a cardinality of 0 . . . 1 428364. Particularly, for each instance of the GoodsMovementInformation 428280 entity there may be one ProjectWorkBreakdownStructureElementID 428362 attribute.

The GoodsMovementTypeCode 428368 attribute is a GoodsMovementTypeCode 428372 datatype. The GoodsMovementTypeCode 428368 attribute has a cardinality of 1 428370. Particularly, for each instance of the GoodsMovementInformation 428280 entity there is one GoodsMovementTypeCode 428368 attribute.

The InventoryUsabilityCode 428374 attribute is an InventoryUsabilityCode 428378 datatype. The InventoryUsabilityCode 428374 attribute has a cardinality of 0 . . . 1 428376. Particularly, for each instance of the GoodsMovementInformation 428280 entity there may be one InventoryUsabilityCode 428374 attribute.

The InventorySpecialStockTypeCode 428380 attribute is an InventorySpecialStockTypeCode 428384 datatype. The InventorySpecialStockTypeCode 428380 attribute has a cardinality of 0 . . . 1 428382. Particularly, for each instance of the GoodsMovementInformation 428280 entity there may be one InventorySpecialStockTypeCode 428380 attribute.

The InventoryValuationTypeCode 428386 attribute is an InventoryValuationTypeCode 428390 datatype. The InventoryValuationTypeCode 428386 attribute has a cardinality of 0 . . . 1 428388. Particularly, for each instance of the GoodsMovementInformation 428280 entity there may be one InventoryValuationTypeCode 428386 attribute.

The InputQuantity 428392 attribute is a Quantity 428396 datatype. The InputQuantity 428392 attribute has a cardinality of 1 428394. Particularly, for each instance of the GoodsMovementInformation 428280 entity there is one InputQuantity 428392 attribute.

The DeliveryCompletedIndicator 428398 attribute is an Indicator 428402 datatype. The DeliveryCompletedIndicator 428398 attribute has a cardinality of 0 . . . 1 428400. Particularly, for each instance of the GoodsMovementInformation 428280 entity there may be one DeliveryCompletedIndicator 428398 attribute.

The WithdrawnCompletedIndicator 428404 attribute is an Indicator 428408 datatype. The WithdrawnCompletedIndicator 428404 attribute has a cardinality of 0 . . . 1 428406. Particularly, for each instance of the GoodsMovementInformation 428280 entity there may be one WithdrawnCompletedIndicator 428404 attribute.

The GoodsMovementItemDescription 428410 attribute is a GoodsMovementItemDescription 428414 datatype. The GoodsMovementItemDescription 428410 attribute has a cardinality of 0 . . . 1 428412. Particularly, for each instance of the GoodsMovementInformation 428280 entity there may be one GoodsMovementItemDescription 428410 attribute.

The GoodsRecipientName 428416 attribute is a GoodsRecipientName 428420 datatype. The GoodsRecipientName 428416 attribute has a cardinality of 0 . . . 1 428418. Particularly, for each instance of the GoodsMovementInformation 428280 entity there may be one GoodsRecipientName 428416 attribute.

The UnloadingPointName 428422 attribute is an UnloadingPointName 428426 datatype. The UnloadingPointName 428422 attribute has a cardinality of 0 . . . 1 428424. Particularly, for each instance of the GoodsMovementInformation 428280 entity there may be one UnloadingPointName 428422 attribute.

The GoodsMovementReferenceDocumentTypeCode 428428 attribute is a GoodsMovementReferenceDocumentTypeCode 428432 datatype. The GoodsMovementReferenceDocumentTypeCode 428428 attribute has a cardinality of 1 428430. Particularly, for each instance of the GoodsMovementInformation 428280 entity there is one GoodsMovementReferenceDocumentTypeCode 428428 attribute.

The GoodsMovementReasonCode 428434 attribute is a GoodsMovementReasonCode 428438 datatype. The GoodsMovementReasonCode 428434 attribute has a cardinality of 0 . . . 1 428436. Particularly, for each instance of the GoodsMovementInformation 428280 entity there may be one GoodsMovementReasonCode 428434 attribute.

The BatchExpirationDate 428440 attribute is a Date 428444 datatype. The BatchExpirationDate 428440 attribute has a cardinality of 0 . . . 1 428442. Particularly, for each instance of the GoodsMovementInformation 428280 entity there may be one BatchExpirationDate 428440 attribute.

The BatchProductionDate 428446 attribute is a Date 428450 datatype. The BatchProductionDate 428446 attribute has a cardinality of 0 . . . 1 428448. Particularly, for each instance of the GoodsMovementInformation 428280 entity there may be one BatchProductionDate 428446 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties ProductionConfirmation Package A ProductionConfirmation package groups the business information relevant for the confirmation of a production order or a production order operation. It contains the ProductionConfirmation and GoodsMovementInformation entities.

ProductionConfirmation

A production confirmation confirms the quantities of produced goods (yield and/or scrap), the quantity of produced goods to be reworked, the time consumed as well as the performed work quantities during the execution of a production order or a production order operation. GroupID identifies a production confirmation group. A production confirmation group groups individual production confirmations related to a production order or a production order operation. ExternalSystemConfirmationID identifies a confirmation executed in an external confirmation system. ProductionOrderID is the unique identifier of a production order. ProductionOrderSequenceID identifies a production order sequence in the context of a ProductionOrderID. ProductionOrderOperationID is the unique identifier of a production order operation in the context of a ProductionOrderSequenceID. PlantID identifies the plant in which the production order or production order operation to be confirmed has been executed in. WorkCentreID identifies the work centre used to perform the production order operation to be confirmed. CapacitySplitID identifies a single split of a capacity category of the production order operation to be confirmed. ExternalSystemUserAccountID is the unique identifier of the person's system account in an external production confirmation system who executed the production confirmation. EmployeeID is the unique identifier of the person who performed the production order operation to be confirmed. EmployeeTimeRecordingCardID is the unique identifier of the time recording card of the person who performed the production order operation to be confirmed. CompensationComponentTypeID identifies the compensation component type of the person who performed the production order operation. CompensationComponentTypeGroupID identifies the compensation component type group of the person who performed the production order operation. RecordTypeCode is a coded representation of the category and the type of a production confirmation (e.g. final activity confirmation, partial time ticket confirmation, final time ticket confirmation) as well as the time event in case of time event confirmation. PostingDate is the posting date of the production confirmation. OpenReservationCompletedIndicator indicates if open reservations shall be completed by the production confirmation. CapacityCategoryCode represents the category of the capacity of the production order operation be confirmed. EmployeeSuitabilityCode represents the employee suitability (qualification) necessary to perform the production order operation to be confirmed. EmployeeNumberValue represents the number of employees who performed the production order operation to be confirmed. ExternalSystemCreationDate is the external confirmation system's system date at which the production confirmation has been created. ExecutionDateTimePeriod represents the start and end time points of the execution of the production order operation to be confirmed. SetupDateTimePeriod represents the start and end time points of the setup of the production order operation to be confirmed. ProcessingDateTimePeriod represents the start and end time points of the processing of the production order operation to be confirmed. TeardownDateTimePeriod represents the start and end time points of the tearing down of the production order operation to be confirmed. FirstWorkQuantity represents the first out of six different work quantities that can be confirmed within the confirmation of a production step. FirstWorkQuantityCompletedIndicator indicates that no further confirmation on the first work quantity for this production step is expected. SecondWorkQuantity represents the second out of six different work quantities that can be confirmed within the confirmation of a production step. SecondWorkQuantityCompletedIndicator indicates that no further confirmation on the second work quantity for this production step is expected. ThirdWorkQuantity represents the third out of six different work quantities that can be confirmed within the confirmation of a production step. ThirdWorkQuantityCompletedIndicator indicates that no further confirmation on the third work quantity for this production step is expected. FourthWorkQuantity represents the fourth out of six different work quantities that can be confirmed within the confirmation of a production step. FourthWorkQuantityCompletedIndicator indicates that no further confirmation on the fourth work quantity for this production step is expected. FifthWorkQuantity represents the fifth out of six different work quantities that can be confirmed within the confirmation of a production step. FifthWorkQuantityCompletedIndicator indicates that no further confirmation on the fifth work quantity for this production step is expected. SixthWorkQuantity represents the sixth out of six different work quantities that can be confirmed within the confirmation of a production step. SixthWorkQuantityCompletedIndicator indicates that no further confirmation on the sixth work quantity for this production step is expected. BusinessProcessWorkQuantity represents the work quantity that shall be recorded on a certain business process defined at work centre level. BusinessProcessWorkQuantityCompletedIndicator indicates that no further confirmation on the business process work quantity for this production step is expected. YieldQuantity is the quantity of the produced good that meets the quality requirements. ScrapQuantity is the quantity of the produced good that may never meet the quality requirements and is thus to be discarded. ReworkQuantity is the quantity of the produced good that does but can be reworked in order to meet the quality requirements. LogisticsDeviationReasonCode is a coded representation of reasons for a deviation of the yield quantity from the planned value. Description can be used to describe or to comment on the production confirmation.

If ProductionConfirmation being of specialization 'ProductionOrderConfirmation' ProductionConfirmationGroupID can not be used. If ProductionConfirmation being of specializations 'TimeEventConfirmation', 'TimeTicketConfirmation' or 'ActivityConfirmation' it can be used. If used, the elements ProductionOrderID, ProductionOrderSequenceID and ProductionOrderOperationID are obsolete. If ProductionConfirmationGroupID is not used, elements ProductionOrderID, ProductionOrderSequenceID and ProductionOrderOperationID become mandatory.

If ProductionConfirmation being of specialization 'ProductionOrderConfirmation' ProductionConfirmationProductionOrderID is mandatory. For further hints review constraints of If ProductionConfirmation being of specialization 'ProductionOrderConfirmation' ProductionConfirmationSequenceID can not be used. If ProductionConfirmation being of specializations 'TimeEventConfirmation', 'TimeTicketConfirmation' or 'ActivityConfirmation' it can be used. If it is not used there, value '0' for 'main sequence' is interpreted. If ProductionOrder is a my SAP ERP process order, ProductionConfirmationSequenceID can not have any other value than '0' (zero).

If ProductionConfirmation being of specialization 'ProductionOrderConfirmation' ProductionConfirmationOperationID can not be used. If ProductionConfirmation being of specializations 'TimeEventConfirmation', 'TimeTicketConfirmation' or 'ActivityConfirmation' it can be used. If ProductionOrderOperation is a phase or a suboperation, ProductionConfirmationOperationID can also be used. For further hints review constraints of ProductionConfirmationPlantID is optional. If element WorkCentreID is used, PlantID becomes mandatory. If ProductionConfirmation being of specialization 'ProductionOrderConfirmation' PlantID can not be used. ProductionConfirmation WorkCentreID can not be used if ProductionConfirmation being of specialization 'ProductionOrderConfirmation'. If ProductionConfirmation being of specialization 'ProductionOrderConfirmation' WorkCentre can not be used. CapacitySplitID can only be used in combination with CapacityCategoryCode. If ProductionConfirmation being of specialization 'ProductionOrderConfirmation' ProductionConfirmationEmployeeID can not be used. If ProductionConfirmation being of specialization 'ProductionOrderConfirmation' ProductionConfirmationEmployeeTimeRecordingCardID can not be used.

ProductionConfirmationRecordTypeCode is mandatory in order to decide which specializaition of ProductionConfirmation is requested. Record type codes starting with 'H' are reserved for ProductionConfirmation being a 'ProductionOrderConfirmation', record type codes starting with 'L' are reserved for ProductionConfirmation being a 'TimeTicketConfirmation', Record type codes starting with 'V' are reserved for ProductionConfirmation being an 'ActivityConfirmation' and record type codes starting with 'A', 'B' and 'R' are reserved for ProductionConfirmation being a 'TimeEventConfirmation'. If ProductionOrder being a former my SAP ERP process order, record type codes starting with 'A' or 'R' are not supported.

If ProductionConfirmation being a 'TimeEventConfirmation' or an 'ActivityConfirmation' ProductionConfirmationExecution DateTimePeriod can not be used. ProductionConfirmationSetupDateTimePeriod can only be used if ProductionConfirmation being a 'TimeEventConfirmation' but not for production orders being a my SAP ERP process order ProductionConfirmationProcessingDateTimePeriod can only be used if ProductionConfirmation being a 'TimeEventConfirmation'. ProductionConfirmationTeardownDateTimePeriod can only be used if ProductionConfirmation being a 'TimeEventConfirmation' but not for production orders being a my SAP ERP process order. If ProductionConfirmation being an 'ActivityConfirmation' ProductionConfirmationYieldQuantity can not be used. If ProductionConfirmation being an 'ActivityConfirmation' ProductionConfirmationScrapQuantity can not be used. If ProductionConfirmation being an 'ActivityConfirmation' ProductionConfirmationReworkQuantity can not be used. ReworkQuantity is not allowed for production orders being a my SAP ERP process order either. Usage of ProductionConfirmationLogistics deviation reason code is forseen only in combination with ScrapQuantity.

GoodsMovementInformation Package

A GoodsMovementInformation package groups the relevant business information about goods movements related to a production order or a production order operation. It contains the GoodsMovementInformation entity.

GoodsMovementInformation

GoodsMovementInformation contains information about the movement of stock from an inventory managed location to production (input or consumed goods) or from production to an inventory managed location (output or produced goods) finally resulting in a change in inventory. If ProductionConfirmation being an 'ActivityConfirmation' GoodsMovementInformation is not allowed. In case of ProductionConfirmation being a 'TimeEventConfirmation' GoodsMovementInformation is allowed only for time events represented by ProductionConfirmationRecordTypeCode 'B20' or 'B40'.

If GoodsMovementInformation is used, the planned material inputs as well as the planned material outputs from the production order are not considered. MaterialInternalID is the unique identifier of a material consumed or produced during the production process that is to be moved to or from an inventory managed location. PlantID is the unique identifier of the plant the consumed or produced goods are or have been stored. InventoryManagedLocationID is the unique identifier of the inventory managed location in the context of the specified plant ID the consumed or produced goods have been taken from or put into. BatchID is the unique identifier of a batch in the context of a material ID. If the corresponding material has a batch requirement, BatchID is mandatory. ConsignmentStockVendorID is the unique identifier of the vendor which provides the vendor consignment stock or the pipeline material. If a special stock type code representing pipeline or vendor consignment stock is chosen, ConsignmentStockVendorID is mandatory. ConsignmentCustomerID is the unique identifier of a customer which obtains the stock. If a special stock type code representing customer consignment stock is chosen, ConsignmentStockCustomerID is mandatory. SalesOrderID is the unique identifier of the sales order the consumed or produced good to be moved is assigned to. If a special stock type code representing sales order stock is chosen, SalesOrderID is mandatory. SalesOrderItemID is the unique identifier of a sales order item in the context of a sales order ID the consumed or produced good to be moved is assigned to. If a special stock type code representing sales order stock is chosen, SalesOrderItemID is mandatory. ProductionOrderID is the unique identifier of a production order, for which the goods movement is to be posted. ProductionOrderItemID is the unique identifier of a production order item in the context of a production order ID. ProductionOrderOperationID is the unique identifier of a production order Operation in the context of a ProductionOrderSequenceID. ReservationID is a unique identifier of the corresponding reservation of the production order. ReservationItemID identifies the reservation item the goods movements of a production order is posted with reference to. ProjectWorkBreakdownStructureElementID identifies a single structure element of the project the consumed or produced good to be moved is assigned to. If a special stock type code representing project stock is chosen, ProjectWorkBreakdownStructureElement is mandatory. GoodsMovementTypeCode is a coded representation of the type of the goods movement (e.g. goods issue for production, reversal of goods receipt for production order, goods receipt by product). InventoryUsabilityCode specifies the usability of a goods movement into inventory, i.e. into unrestricted stock, into restricted stock or into quality stock. InventorySpecialStockTypeCode is a coded representation of the special stock the goods receipts are posted into or the goods issues are to be withdrawn from, e.g. pipeline stock, vendor consignment stock, sales order stock, project stock. InventoryValuationTypeCode is the coded representation of the valuation type that is supposed to be assigned to the produced goods to be moved. InputQuantity quantifies the amount of consumed or produced goods during execution of the production order or production step to be confirmed. DeliveryCompletedIndicator indicates that no further goods receipts of a main product to the production order are expected. WithdrawalCompletedIndicator indicates that no further goods issues (material inputs) or goods receipts of by-products (material outputs) are expected. ItemDescription can be used to comment on the production confirmation goods movement. GoodsRecipientName is the name of the recipient of the material output. UnloadingPointName is the name of the location where the output material has to be unloaded. GoodsMovementReferenceDocumentTypeCode is a coded representation of a goods movement reference type. It is necessary to differ between goods receipts for production orders and other goods movements for production orders i.e. goods issues or goods receipts by-product. GoodsMovementReasonCode is a coded representation of a reason for a goods movement. BatchExpirationDate is the expiration date of a good handled in batches. BatchProductionDate is the date a good handled in batches has been produced. GoodsMovementInformationInventoryManagedLocationInternalID is mandatory except if SpecialStockTypeCode '4' or '5' is chosen. GoodsMovementInformationBatchID is mandatory if a material is handled in batches. If SpecialStockTypeCode '3' or '4' is chosen GoodsMovementInformationConsignmentStockVendorInternalID is mandatory. If SpecialStockTypeCode '5' is chosen GoodsMovementInformationConsignmentStockCustomerID is mandatory.

If SpecialStockTypeCode '1' is chosen GoodsMovementInformationSalesOrderID is mandatory. GoodsMovementInformationSalesOrderItemID is mandatory if GoodsMovementInformationSalesOrderID is used. GoodsMovementInformationProductionOrderID is mandatory. It can not differ from ProductionConfirmationProductionOrderID. GoodsMovementInformationProductionOrderItemID is mandatory if a GoodsMovementInformationReferenceDocumentTypeCode '2' (goods receipt for production order) is chosen.

GoodsMovementInformationReservationID shall be related to the corresponding GoodsMovementInformationProductionOrderID. GoodsMovementInformationReservationID for reservations others than in the corresponding production order is not allowed. If GoodsMovementInformationReservationID is used GoodsMovementInformationReservationItemID is mandatory. If SpecialStockTypeCode '2' is chosen GoodsMovementInformationProjectTaskWorkBreakdownStructureID is mandatory.

GoodsMovementInformationGoodsMovementTypeCode is mandatory. If a GoodsMovementInformationReferenceDocumentTypeCode '2' (goods receipt for production order) is chosen, GoodsMovementInformationInventoryUsabilityCode becomes mandatory. If the material is split valuated GoodsMovementInformation is mandatory. GoodsMovementInformationInputQuantity is mandatory. If a quantity '0' (zero) is chosen, goods movement information will not be converted into goods movement (no material document will be created).

GoodsMovementInformationBatchExpirationDate may only be valuated if the material is subject to batch management requirement. This may also include the valuation of GoodsMovementInformationBatchID.

GoodsMovementInformationBatchProductionDate may only be valuated if the material is subject to batch management requirement. This may also include the valuation of GoodsMovementInformationBatchID.

Message Data Type

The message data type ProductionConfirmationCreateConfirmationMessage contains the Production Confirmation information included in the business document and the business information that is relevant for sending a business document in a message. It contains the MessageHeader, ProductionConfirmation and Log packages.

FIGS. 426-1 through 426-2 show a ProductionConfirmationCreateConfirmationMessage 42600 package. The ProductionConfirmationCreateConfirmationMessage 42600 package is a ProductionConfirmationCreateConfirmationMessage 42604 datatype. The ProductionConfirmationCreateConfirmationMessage 42600 package includes a ProductionConfirmationCreateConfirmationMessag 42602 entity. The ProductionConfirmationCreateConfirmationMessage 42600 package includes various packages, namely MessageHeader 42606, ProductionConfirmation 42614 and Log 42650.

The MessageHeader 42606 package is a BasicBusinessDocumentMessageHeader 42612 datatype. The MessageHeader 42606 package includes a MessageHeader 42608 entity.

The ProductionConfirmation 42614 package includes a ProductionConfirmation 42616 entity.

The ProductionConfirmation 42616 entity has a cardinality of zero or one 42618 meaning that for each instance of the ProductionConfirmationCreateConfirmationMessag 42602 entity there may be one ProductionConfirmation 42616 entity. The ProductionConfirmation 42616 entity includes various attributes, namely GroupID 42620, CounterValue 42626, RecordTypeCode 42632, CreationDateTime 42638 and CreationUserAccountID 42644.

The GroupID 42620 attribute is a ProductionConfirmationGroupID 42624 datatype. The GroupID 42620 attribute has a cardinality of one 42622 meaning that for each instance of the ProductionConfirmation 42616 entity there is one GroupID 42620 attribute.

The CounterValue 42626 attribute is a CounterValue 42630 datatype. The CounterValue 42626 attribute has a cardinality of one 42628 meaning that for each instance of the ProductionConfirmation 42616 entity there is one CounterValue 42626 attribute.

The RecordTypeCode 42632 attribute is a ProductionConfirmationRecordTypeCode 42636 datatype. The RecordTypeCode 42632 attribute has a cardinality of one 42634 meaning that for each instance of the ProductionConfirmation 42616 entity there is one RecordTypeCode 42632 attribute.

The CreationDateTime 42638 attribute is a DateTime 42642 datatype. The CreationDateTime 42638 attribute has a cardinality of one 42640 meaning that for each instance of the ProductionConfirmation 42616 entity there is one CreationDateTime 42638 attribute.

The CreationUserAccountID 42644 attribute is an UserAccountID 42648 datatype. The CreationUserAccountID 42644 attribute has a cardinality of one 42646 meaning that for each instance of the ProductionConfirmation 42616 entity there is one CreationUserAccountID 42644 attribute.

The Log 42650 package is a Log 42656 datatype. The Log 42650 package includes a Log 42652 entity.

The Log 42652 entity has a cardinality of one 42654 meaning that for each instance of the ProductionConfirmationCreateConfirmationMessag 42602 entity there is one Log 42652 entity.

FIGS. 427-1 through 427-2 show a ProductionConfirmationCreateConfirmationMessage_sync 42700 package. The ProductionConfirmationCreateConfirmationMessage_sync 42700 package is a ProductionConfirmationCreateConfirmationMessage_sync 42704 datatype. The ProductionConfirmationCreateConfirmationMessage_sync 42700 package includes a ProductionConfirmationCreateConfirmationMessage_sync 42702 entity. The ProductionConfirmationCreateConfirmationMessage_sync 42700 package includes various packages, namely MessageHeader 42706, ProductionConfirmation 42714 and Log 42750.

The MessageHeader 42706 package is a BasicBusinessDocumentMessageHeader 42712 datatype. The MessageHeader 42706 package includes a MessageHeader 42708 entity.

The ProductionConfirmation 42714 package includes a ProductionConfirmation 42716 entity.

The ProductionConfirmation 42716 entity has a cardinality of zero or one 42718 meaning that for each instance of the ProductionConfirmationCreateConfirmationMessage_sync 42702 entity there may be one ProductionConfirmation 42716 entity. The ProductionConfirmation 42716 entity includes various attributes, namely GroupID 42720, CounterValue 42726, RecordTypeCode 42732, CreationDateTime 42738 and CreationUserAccountID 42744.

The GroupID 42720 attribute is a ProductionConfirmationGroupID 42724 datatype. The GroupID 42720 attribute has a cardinality of one 42722 meaning that for each instance of the ProductionConfirmation 42716 entity there is one GroupID 42720 attribute.

The CounterValue 42726 attribute is a CounterValue 42730 datatype. The CounterValue 42726 attribute has a cardinality of one 42728 meaning that for each instance of the ProductionConfirmation 42716 entity there is one CounterValue 42726 attribute.

The RecordTypeCode 42732 attribute is a ProductionConfirmationRecordTypeCode 42736 datatype. The RecordTypeCode 42732 attribute has a cardinality of one 42734 meaning that for each instance of the ProductionConfirmation 42716 entity there is one RecordTypeCode 42732 attribute.

The CreationDateTime 42738 attribute is a DateTime 42742 datatype. The CreationDateTime 42738 attribute has a cardinality of one 42740 meaning that for each instance of the ProductionConfirmation 42716 entity there is one CreationDateTime 42738 attribute.

The CreationUserAccountID 42744 attribute is an UserAccountID 42748 datatype. The CreationUserAccountID 42744 attribute has a cardinality of one 42746 meaning that for each instance of the ProductionConfirmation 42716 entity there is one CreationUserAccountID 42744 attribute.

The Log 42750 package is a Log 42756 datatype. The Log 42750 package includes a Log 42752 entity.

The Log 42752 entity has a cardinality of one 42754 meaning that for each instance of the ProductionConfirmationCreateConfirmationMessage_sync 42702 entity there is one Log 42752 entity.

MessageHeader

A MessageHeader contains the information to identify a business document in a message from the perspective of the sending application.

The MessageHeader contains the BasicBusinessDocumentMessageHeader element. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties ProductionConfirmation Package A ProductionConfirmation package groups the business information about the confirmation of a production order or a production order operation. It contains the ProductionConfirmation entity.

ProductionConfirmation

A production confirmation confirms the quantities of produced goods (yield and/or scrap), the quantity of produced goods to be reworked, the time consumed as well as the performed work quantities during the execution of a production order or a production order operation. GroupID is the unique identifier of the production confirmation group. CounterValue is the counter of the production confirmation. ProductionConfirmationCounterValue and ProductionConfirmationGroupID together represent the unique key of a single production confirmation. RecordTypeCode is a coded representation of the record type of a production confirmation which is the combination of production confirmation category and the type of a production confirmation as well as the time event in case of time event confirmation. CreationDateTime is the logical system time point the production confirmation was carried out at. CreatorID is the unique identifier of the person who performed the production confirmation.

Log Package

Log

A log is a sequence of messages that may result from the execution of an application task.

Message Data Type

The message data type ProductionConfirmationCancelRequestMessage_sync contains the Production Confirmation information included in the business document and the business information that is relevant for sending a business document in a message. It contains the MessageHeader and ProductionConfirmation packages.

FIG. 425 shows a ProductionConfirmationCancelRequestMessage_sync 42500 package. The ProductionConfirmationCancelRequestMessage_sync 42500 package is a ProductionConfirmationCancelRequestMessage_sync 42504 datatype. The ProductionConfirmationCancelRequestMessage_sync 42500 package includes a ProductionConfirmationCancelRequestMessage_sync 42502 entity. The ProductionConfirmationCancelRequestMessage_sync 42500 package includes various packages, namely MessageHeader 42506 and ProductionConfirmation 42514.

The MessageHeader 42506 package is a BasicBusinessDocumentMessageHeader 42512 datatype. The MessageHeader 42506 package includes a MessageHeader 42508 entity.

The MessageHeader 42508 entity has a cardinality of one 42510 meaning that for each instance of the ProductionConfirmationCancelRequestMessage_sync 42502 entity there is one MessageHeader 42508 entity.

The ProductionConfirmation 42514 package includes a ProductionConfirmation 42516 entity.

The ProductionConfirmation 42516 entity has a cardinality of zero or one 42518 meaning that for each instance of the ProductionConfirmationCancelRequestMessage_sync 42502 entity there may be one ProductionConfirmation 42516 entity. The ProductionConfirmation 42516 entity includes various attributes, namely GroupID 42520 and CounterValue 42526.

The GroupID 42520 attribute is a ProductionConfirmationGroupID 42524 datatype. The GroupID 42520 attribute has a cardinality of one 42522 meaning that for each instance of the ProductionConfirmation 42516 entity there is one GroupID 42520 attribute.

The CounterValue 42526 attribute is a CounterValue 42530 datatype. The CounterValue 42526 attribute has a cardinality of one 42528 meaning that for each instance of the ProductionConfirmation 42516 entity there is one CounterValue 42526 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

ProductionConfirmation Package

ProductionConfirmation package contains the ProductionConfirmation entity.

ProductionConfirmation

A ProductionConfirmation entity groups the business information about the production confirmation to be cancelled. A GroupID is the unique identifier of the production confirmation group. A CounterValue is the counter value of the production confirmation to be cancelled Message Data Type The message data type ProductionConfirmationCancelConfirmationMessage_sync contains the Production Confirmation information included in the business document and the business information that is relevant for sending a business document in a message. It contains the MessageHeader, ProductionConfirmation and Log packages.

FIG. 424 shows a ProductionConfirmationCancelConfirmationMessage_sync 42400 package. The ProductionConfirmationCancelConfirmationMessage_sync 42400 package is a ProductionConfirmationCancelConfirmationMessage_sync 42404 datatype. The ProductionConfirmationCancelConfirmationMessage_sync 42400 package includes a ProductionConfirmationCancelConfirmationMessage_sync 42402 entity. The ProductionConfirmationCancelConfirmationMessage_sync 42400 package includes various packages, namely MessageHeader 42406, ProductionConfirmation 42414 and Log 42432.

The MessageHeader 42406 package is a BasicBusinessDocumentMessageHeader 42412 datatype. The MessageHeader 42406 package includes a MessageHeader 42408 entity.

The ProductionConfirmation 42414 package includes a ProductionConfirmation 42416 entity.

The ProductionConfirmation 42416 entity has a cardinality of zero or one 42418 meaning that for each instance of the ProductionConfirmationCancelConfirmationMessage_sync 42402 entity there may be one ProductionConfirmation 42416 entity. The ProductionConfirmation 42416 entity includes various attributes, namely GroupID 42420 and CounterValue 42426.

The GroupID 42420 attribute is a ProductionConfirmationGroupID 42424 datatype. The GroupID 42420 attribute has a cardinality of one 42422 meaning that for each instance of the ProductionConfirmation 42416 entity there is one GroupID 42420 attribute.

The CounterValue 42426 attribute is a CounterValue 42430 datatype. The CounterValue 42426 attribute has a cardinality of one 42428 meaning that for each instance of the ProductionConfirmation 42416 entity there is one CounterValue 42426 attribute.

The Log 42432 package is a Log 42438 datatype. The Log 42432 package includes a Log 42434 entity.

The Log 42434 entity has a cardinality of one 42436 meaning that for each instance of the ProductionConfirmationCancelConfirmationMessage_sync 42402 entity there is one Log 42434 entity.

MessageHeader Package

A MessageHeader package groups the business, information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

ProductionConfirmation Package

A ProductionConfirmation package groups the business information about the confirmation to be cancelled. It contains the ProductionConfirmation entity.

ProductionConfirmation

A ProductionConfirmation entity groups the business information about the cancellation of a production order confirmation. A GroupID is the unique identifier of the production confirmation group. A CounterValue is the counter value of the production confirmation cancelled.

Log Package

Log

A log is a sequence of messages that may result from the execution of an application task.

ProductionOrder Interfaces

Internal material requirements by the supply and demand matching area as well as external requirements require an order for production to produce a certain amount of one or more materials within a certain time frame. As a follow up, production schedulers as well as material requirements planners need to know which production orders are to be executed today, which work centers are involved and which requirements from in-house, from projects or from sales orders can be fulfilled.

Message Choreography

The message choreography of FIG. 430 describes a possible logical sequence of messages that can be used to realize a production order business scenario.

A ProductionOrderSimpleByElementsQuery_sync is a query to Production asking for production orders matching with the given elements. The structure of the message type ProductionOrderSimpleByElementsQuery_sync is specified by the message data type ProductionOrderSimpleByElementsQueryMessage.

A ProductionOrderSimpleByElementsResponse_sync is the response to a ProductionOrderSimpleByElementsQuery_sync. The structure of the message type ProductionOrderSimpleByElementsResponse_sync is specified by the message data type ProductionOrderSimpleByElementsResponseMessage.

A ProductionOrderSimpleByWorkCentreQuery_sync is a query to Production asking for production orders matching with the given work centre. The structure of the message type ProductionOrderSimpleByWorkCentreQuery_sync is specified by the message data type ProductionOrderSimpleByWorkCentreQueryMessage.

A ProductionOrderSimpleByWorkCentreResponse_sync is the response to a ProductionOrderSimpleByWorkCentreQuery_sync. The structure of the message type ProductionOrderSimpleByWorkCentreResponse_sync is specified by the message data type ProductionOrderSimpleByWorkCentreResponseMessage.

A ProductionOrderByIDQuery_sync is a query to Production asking for production order details for the given production order ID. The structure of the message type ProductionOrderByIDQuery_sync is specified by the message data type ProductionOrderByIDQuery Message.

A ProductionOrderByIDResponse_sync is the response to a ProductionOrderByIDQuery_sync. The structure of the message type ProductionOrderByIDResponse_sync is specified by the message data type ProductionOrderByIDResponseMessage.

For example, a "Manufacturing Execution" system 430002 can query production orders by elements using the ProductionOrderSimpleByElementsQuery_sync message 430006 as shown, for example, in FIG. 433. A "Production" system 430004 can respond to the query using the ProductionOrderSimpleByElementsResponse_sync message 430008 as shown, for example, in FIG. 434. The "Manufacturing Execution" system 430002 can query production orders by work centre using the ProductionOrderSimpleByWorkCentreQuery_sync message 430010 as shown, for example, in FIG. 435. The "Production" system 430004 can respond to the query using the ProductionOrderSimpleByWorkCentreResponse_sync message 430012 as shown, for example, in FIG. 436. The "Manufacturing Execution" system 430002 can query production orders by ID using the ProductionOrderByIDQuery_sync message 430014 as shown, for example, in FIG. 431. The "Production" system 430004 can respond to the query using the ProductionOrderByIDResponse_sync message 4300016 as shown, for example, in FIG. 432.

Message Data Type

The message data type ProductionOrderSimpleByElementsQueryMessage_sync contains the ProductionOrderSimpleByElementsQuery included in the business document and the business information that is relevant for sending a business document in a message. FIGS. 439-1 through 439-10 show a ProductionOrderSimpleByElementsQueryMessage 439000 package. The ProductionOrderSimpleByElementsQueryMessage 439000 package is a ProductionOrderSimpleByElementsQueryMessage 439004 datatype. The ProductionOrderSimpleByElementsQueryMessage 439000 package includes a ProductionOrderSimpleByElementsQueryMessage 439002 entity. The ProductionOrderSimpleByElementsQueryMessage 439000 package includes various packages, namely MessageHeader 439006 and ProductionOrderSimpleSelectionByElements 439014.

The MessageHeader 439006 package is a BasicBusinessDocumentMessageHeader 439012 datatype. The MessageHeader 439006 package includes a MessageHeader 439008 entity.

The MessageHeader 439008 entity has a cardinality of zero or one 439010 meaning that for each instance of the ProductionOrderSimpleByElementsQueryMessage 439002 entity there may be one MessageHeader 439008 entity.

The ProductionOrderSimpleSelectionByElements 439014 package includes a ProductionOrderSimpleSelectionByElements 439016 entity.

The ProductionOrderSimpleSelectionByElements 439016 entity has a cardinality of one 439018 meaning that for each instance of the ProductionOrderSimpleByElementsQueryMessage 439002 entity there is one ProductionOrderSimpleSelectionByElements 439016 entity. The ProductionOrderSimpleSelectionByElements 439016 entity includes various attributes, namely ERPProductionOrderRequiredIndicator 439020 and ERPProcessOrderRequiredIndicator 439026. The ProductionOrderSimpleSelectionByElements 439016 entity has various subordinate entities, namely SelectionByPlantID 439032, SelectionBySupplyPlanningAreaID 439056, SelectionByMaterialID 439080, SelectionByMaterialRequirementsPlanningControllerID 4390104, SelectionByProductionSchedulerID 4390128, SelectionBySalesOrderID 4390152, SelectionByProjectWorkBreakdownStructureElement 4390176 and SelectionByProductionOrderTypeCode 4390200.

The ERPProductionOrderRequiredIndicator 439020 attribute is an Indicator 439024 datatype. The ERPProductionOrderRequiredIndicator 439020 attribute has a cardinality of one 439022 meaning that for each instance of the ProductionOrderSimpleSelectionByElements 439016 entity there is one ERPProductionOrderRequiredIndicator 439020 attribute.

The ERPProcessOrderRequiredIndicator 439026 attribute is an Indicator 439030 datatype. The ERPProcessOrderRequiredIndicator 439026 attribute has a cardinality of one 439028 meaning that for each instance of the ProductionOrderSimpleSelectionByElements 439016 entity there is one ERPProcessOrderRequiredIndicator 439026 attribute.

The SelectionByPlantID 439032 entity has a cardinality of zero or n 439034 meaning that for each instance of the ProductionOrderSimpleSelectionByElements 439016 entity there may be one or more SelectionByPlantID 439032 entities. The SelectionByPlantID 439032 entity has various subordinate entities, namely InclusionExclusionCode 439036, IntervalBoundaryTypeCode 439040, LowerBoundaryPlantID 439044 and UpperBoundaryPlantID 439050.

The InclusionExclusionCode 439036 entity has a cardinality of one 439038 meaning that for each instance of the SelectionByPlantID 439032 entity there is one InclusionExclusionCode 439036 entity.

The IntervalBoundaryTypeCode 439040 entity has a cardinality of one 439042 meaning that for each instance of the SelectionByPlantID 439032 entity there is one IntervalBoundaryTypeCode 439040 entity.

The LowerBoundaryPlantID 439044 entity has a cardinality of one 439046 meaning that for each instance of the SelectionByPlantID 439032 entity there is one LowerBoundaryPlantID 439044 entity.

The UpperBoundaryPlantID 439050 entity has a cardinality of zero or one 439052 meaning that for each instance of the SelectionByPlantID 439032 entity there may be one UpperBoundaryPlantID 439050 entity.

The SelectionBySupplyPlanningAreaID 439056 entity has a cardinality of zero or n 439058 meaning that for each instance of the ProductionOrderSimpleSelectionByElements 439016 entity there may be one or more SelectionBySupplyPlanningAreaID 439056 entities. The SelectionBySupplyPlanningAreaID 439056 entity has various subordinate entities, namely InclusionExclusionCode 439060, IntervalBoundaryTypeCode 439064, LowerBoundarySupplyPlanningAreaID 439068 and UpperBoundarySupplyPlanningAreaID 439074.

The InclusionExclusionCode 439060 entity has a cardinality of one 439062 meaning that for each instance of the SelectionBySupplyPlanningAreaID 439056 entity there is one InclusionExclusionCode 439060 entity.

The IntervalBoundaryTypeCode 439064 entity has a cardinality of one 439066 meaning that for each instance of the SelectionBySupplyPlanningAreaID 439056 entity there is one IntervalBoundaryTypeCode 439064 entity.

The LowerBoundarySupplyPlanningAreaID 439068 entity has a cardinality of one 439070 meaning that for each instance of the SelectionBySupplyPlanningAreaID 439056 entity there is one LowerBoundarySupplyPlanningAreaID 439068 entity.

The UpperBoundarySupplyPlanningAreaID 439074 entity has a cardinality of zero or one 439076 meaning that for each instance of the SelectionBySupplyPlanningAreaID 439056 entity there may be one UpperBoundarySupplyPlanningAreaID 439074 entity.

The SelectionByMaterialID 439080 entity has a cardinality of zero or n 439082 meaning that for each instance of the ProductionOrderSimpleSelectionByElements 439016 entity there may be one or more SelectionByMaterialID 439080 entities. The SelectionByMaterialID 439080 entity has various subordinate entities, namely InclusionExclusionCode 439084, IntervalBoundaryTypeCode 439088, LowerBoundaryMaterialID 439092 and UpperBoundaryMaterialID 439098.

The InclusionExclusionCode 439084 entity has a cardinality of one 439086 meaning that for each instance of the SelectionByMaterialID 439080 entity there is one InclusionExclusionCode 439084 entity.

The IntervalBoundaryTypeCode 439088 entity has a cardinality of one 439090 meaning that for each instance of the SelectionByMaterialID 439080 entity there is one IntervalBoundaryTypeCode 439088 entity.

The LowerBoundaryMaterialID 439092 entity has a cardinality of one 439094 meaning that for each instance of the SelectionByMaterialID 439080 entity there is one LowerBoundaryMaterialID 439092 entity.

The UpperBoundaryMaterialID 439098 entity has a cardinality of zero or one 4390100 meaning that for each instance of the SelectionByMaterialID 439080 entity there may be one UpperBoundaryMaterialID 439098 entity.

The SelectionByMaterialRequirementsPlanningControllerID 4390104 entity has a cardinality of zero or n 4390106 meaning that for each instance of the ProductionOrderSimpleSelectionByElements 439016 entity there may be one or more SelectionByMaterialRequirementsPlanningControllerID 4390104 entities. The SelectionByMaterialRequirementsPlanningControllerID 4390104 entity has various subordinate entities, namely InclusionExclusionCode 4390108, IntervalBoundaryTypeCode 4390112, LowerBoundaryMaterialRequirementsPlanningControllerID 4390116 and UpperBoundaryMaterialRequirementsPlanningControllerID 4390122.

The InclusionExclusionCode 4390108 entity has a cardinality of one 4390110 meaning that for each instance of the SelectionByMaterialRequirementsPlanningControllerID 4390104 entity there is one InclusionExclusionCode 4390108 entity.

The IntervalBoundaryTypeCode 4390112 entity has a cardinality of one 4390114 meaning that for each instance of the SelectionByMaterialRequirementsPlanningControllerID 4390104 entity there is one IntervalBoundaryTypeCode 4390112 entity.

The LowerBoundaryMaterialRequirementsPlanningControllerID 4390116 entity has a cardinality of one 4390118 meaning that for each instance of the SelectionByMaterialRequirementsPlanningControllerID 4390104 entity there is one LowerBoundaryMaterialRequirementsPlanningControllerID 4390116 entity.

The UpperBoundaryMaterialRequirementsPlanningControllerID 4390122 entity has a cardinality of zero or one 4390124 meaning that for each instance of the SelectionByMaterialRequirementsPlanningControllerID 4390104 entity there may be one UpperBoundaryMaterialRequirementsPlanningControllerID 4390122 entity.

The SelectionByProductionSchedulerID 4390128 entity has a cardinality of zero or n 4390130 meaning that for each instance of the ProductionOrderSimpleSelectionByElements 439016 entity there may be one or more SelectionByProductionSchedulerID 4390128 entities. The SelectionByProductionSchedulerID 4390128 entity has various subordinate entities, namely InclusionExclusionCode 4390132, IntervalBoundaryTypeCode 4390136, LowerBoundaryProductionSchedulerID 4390140 and UpperBoundaryProductionSchedulerID 4390146.

The InclusionExclusionCode 4390132 entity has a cardinality of one 4390134 meaning that for each instance of the SelectionByProductionSchedulerID 4390128 entity there is one InclusionExclusionCode 4390132 entity.

The IntervalBoundaryTypeCode 4390136 entity has a cardinality of one 4390138 meaning that for each instance of the SelectionByProductionSchedulerID 4390128 entity there is one IntervalBoundaryTypeCode 4390136 entity.

The LowerBoundaryProductionSchedulerID 4390140 entity has a cardinality of one 4390142 meaning that for each instance of the SelectionByProductionSchedulerID 4390128 entity there is one LowerBoundaryProductionSchedulerID 4390140 entity.

The UpperBoundaryProductionSchedulerID 4390146 entity has a cardinality of zero or one 4390148 meaning that for each instance of the SelectionByProductionSchedulerID 4390128 entity there may be one UpperBoundaryProductionSchedulerID 4390146 entity.

The SelectionBySalesOrderID 4390152 entity has a cardinality of zero or n 4390154 meaning that for each instance of the ProductionOrderSimpleSelectionByElements 439016 entity there may be one or more SelectionBySalesOrderID 4390152 entities. The SelectionBySalesOrderID 4390152 entity has various subordinate entities, namely InclusionExclusionCode 4390156, IntervalBoundaryTypeCode 4390160, LowerBoundarySalesOrderID 4390164 and UpperBoundarySalesOrderID 4390170.

The InclusionExclusionCode 4390156 entity has a cardinality of one 4390158 meaning that for each instance of the SelectionBySalesOrderID 4390152 entity there is one InclusionExclusionCode 4390156 entity.

The IntervalBoundaryTypeCode 4390160 entity has a cardinality of one 4390162 meaning that for each instance of the SelectionBySalesOrderID 4390152 entity there is one IntervalBoundaryTypeCode 4390160 entity.

The LowerBoundarySalesOrderID 4390164 entity has a cardinality of one 4390166 meaning that for each instance of the SelectionBySalesOrderID 4390152 entity there is one LowerBoundarySalesOrderID 4390164 entity.

The UpperBoundarySalesOrderID 4390170 entity has a cardinality of zero or one 4390172 meaning that for each instance of the SelectionBySalesOrderID 4390152 entity there may be one UpperBoundarySalesOrderID 4390170 entity.

The SelectionByProjectWorkBreakdownStructureElement 4390176 entity has a cardinality of zero or n 4390178 meaning that for each instance of the ProductionOrderSimpleSelectionByElements 439016 entity there may be one or more SelectionByProjectWorkBreakdownStructureElement 4390176 entities. The SelectionByProjectWorkBreakdownStructureElement 4390176 entity has various subordinate entities, namely InclusionExclusionCode 4390180, IntervalBoundaryTypeCode 4390184, LowerBoundaryProjectWorkBreakdownStructureElementID 4390188 and UpperBoundaryProjectWorkBreakdownStructureElementID 4390194.

The InclusionExclusionCode 4390180 entity has a cardinality of one 4390182 meaning that for each instance of the SelectionByProjectWorkBreakdownStructureElement 4390176 entity there is one InclusionExclusionCode 4390180 entity.

The IntervalBoundaryTypeCode 4390184 entity has a cardinality of one 4390186 meaning that for each instance of the SelectionByProjectWorkBreakdownStructureElement 4390176 entity there is one IntervalBoundaryTypeCode 4390184 entity.

The LowerBoundaryProjectWorkBreakdownStructureElementID 4390188 entity has a cardinality of one 4390190 meaning that for each instance of the SelectionByProjectWorkBreakdownStructureElement 4390176 entity there is one LowerBoundaryProjectWorkBreakdownStructureElementID 4390188 entity.

The UpperBoundaryProjectWorkBreakdownStructureElementID 4390194 entity has a cardinality of zero or one 4390196 meaning that for each instance of the SelectionByProjectWorkBreakdownStructureElement 4390176 entity there may be one UpperBoundaryProjectWorkBreakdownStructureElementID 4390194 entity.

The SelectionByProductionOrderTypeCode 4390200 entity has a cardinality of zero or n 4390202 meaning that for each instance of the ProductionOrderSimpleSelectionByElements 439016 entity there may be one or more SelectionByProductionOrderTypeCode 4390200 entities. The SelectionByProductionOrderTypeCode 4390200 entity has various subordinate entities, namely InclusionExclusionCode 4390204, IntervalBoundaryTypeCode 4390208, LowerBoundaryProductionOrderTypeCode 4390212 and UpperBoundaryProductionOrderTypeCode 4390218.

The InclusionExclusionCode 4390204 entity has a cardinality of one 4390206 meaning that for each instance of the SelectionByProductionOrderTypeCode 4390200 entity there is one InclusionExclusionCode 4390204 entity.

The IntervalBoundaryTypeCode 4390208 entity has a cardinality of one 4390210 meaning that for each instance of the SelectionByProductionOrderTypeCode 4390200 entity there is one IntervalBoundaryTypeCode 4390208 entity.

The LowerBoundaryProductionOrderTypeCode 4390212 entity has a cardinality of one 4390214 meaning that for each instance of the SelectionByProductionOrderTypeCode 4390200 entity there is one LowerBoundaryProductionOrderTypeCode 4390212 entity.

The UpperBoundaryProductionOrderTypeCode 4390218 entity has a cardinality of zero or one 4390220 meaning that for each instance of the SelectionByProductionOrderTypeCode 4390200 entity there may be one UpperBoundaryProductionOrderTypeCode 4390218 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

Selection Package

ProductionOrderSimpleSelectionByElements

ProductionOrderSimpleSelectionByElements contains the selection criteria for the query. SelectionByMaterialInternalID, which can be optional, is a range of MaterialInternal Identifiers. InclusionExclusionCode is a coded representation of the inclusion of a set into a result set or the exclusion of it. IntervalBoundaryTypeCode is a coded representation of an interval boundary type. LowerBoundaryMaterialInternalID is a unique identifier for a MaterialInternal. The LowerBoundaryMaterialInternal is the lower boundary of the MaterialInternalID identifier interval. UpperBoundaryMaterialInternalID, which can be optional, is a unique identifier for a MaterialInternal. The UpperBoundaryMaterialInternal is the upper boundary of the MaterialInternalID identifier interval. SelectionByPlantID, which can be optional, is a range of Plant Identifiers. InclusionExclusionCode is a coded representation of the inclusion of a set into a result set or the exclusion of it. IntervalBoundaryTypeCode is a coded representation of an interval boundary type. LowerBoundaryPlantID is a unique identifier for a Plant the production order is assigned to. The LowerBoundaryPlant is the lower boundary of the PlantID identifier interval. UpperBoundaryPlantID, which can be optional, is a unique identifier for a Plant the production order is assigned to. The UpperBoundaryPlant is the upper boundary of the PlantID identifier interval. SelectionBySupplyPlanningAreaID, which can be optional, is a range of SupplyPlanningArea Identifiers. InclusionExclusionCode is a coded representation of the inclusion of a set into a result set or the exclusion of it. IntervalBoundaryTypeCode is a coded representation of an interval boundary type. LowerBoundarySupplyPlanningAreaID is a unique identifier for a SupplyPlanningArea the production order is assigned to. The LowerBoundarySupplyPlanningArea is the lower boundary of the SupplyPlanningAreaID identifier interval. UpperBoundarySupplyPlanningAreaID, which can be optional, is a unique identifier for a SupplyPlanningArea the production order is assigned to. The UpperBoundarySupplyPlanningArea is the upper boundary of the SupplyPlanningAreaID identifier interval. SelectionByMaterialRequirementsPlanningControllerID, which can be optional, is a range of MaterialRequirementsPlanningController Identifiers. InclusionExclusionCode is a coded representation of the inclusion of a set into a result set or the exclusion of it. IntervalBoundaryTypeCode is a coded representation of an interval boundary type. LowerBoundaryMaterialRequirementsPlanningControllerID is a unique identifier for a MaterialRequirementsPlanningController assigned to the production order. The LowerBoundaryMaterialRequirementsPlanningController is the lower boundary of the MaterialRequirementsPlanningControllerID identifier interval. UpperBoundaryMaterialRequirementsPlanningControllerID, which can be optional, is a unique identifier for a MaterialRequirementsPlanningController. The UpperBoundaryMaterialRequirementsPlanningController is the upper boundary of the MaterialRequirementsPlanningControllerID identifier interval. SelectionByProductionSchedulerID, which can be optional, is a range of ProductionScheduler Identifiers. InclusionExclusionCode is a coded representation of the inclusion of a set into a result set or the exclusion of it. IntervalBoundaryTypeCode is a coded representation of an interval boundary type. LowerBoundaryProductionSchedulerID is a unique identifier for a ProductionScheduler assigned to the production order. The LowerBoundaryProductionScheduler is the lower boundary of the ProductionSchedulerID identifier interval. UpperBoundaryProductionSchedulerID, which can be optional, is a unique identifier for a ProductionScheduler assigned to the production order. The UpperBoundaryProductionScheduler is the upper boundary of the ProductionSchedulerID identifier interval. SelectionBySalesOrderID, which can be optional, is a range of SalesOrder Identifiers. InclusionExclusionCode is a coded representation of the inclusion of a set into a result set or the exclusion of it. IntervalBoundaryTypeCode is a coded representation of an interval boundary type. LowerBoundarySalesOrderID is a unique identifier for a SalesOrder the production order is assigned to. The LowerBoundarySalesOrder is the lower boundary of the SalesOrderID identifier interval. UpperBoundarySalesOrderID, which can be optional, is a unique identifier for a SalesOrder the production order is assigned to. The UpperBoundarySalesOrder is the upper boundary of the SalesOrderID identifier interval. SelectionByProjectWorkBreakdownStructureElementID, which can be optional, is a range of ProjectWorkBreakdownStructureElement Identifiers. InclusionExclusionCode is a coded representation of the inclusion of a set into a result set or the exclusion of it. IntervalBoundaryTypeCode is a coded representation of an interval boundary type. LowerBoundaryProjectWorkBreakdownStructureElementID is a unique identifier for a ProjectWorkBreakdownStructureElement the production order is assigned to. The LowerBoundary ProjectWorkBreakdownStructureElement is the lower boundary of the ProjectWorkBreakdownStructureElementID identifier interval. UpperBoundaryProjectWorkBreakdownStructureElementID, which can be optional, is a unique identifier for a ProjectWorkBreakdownStructureElement the production order is assigned to. The UpperBoundary ProjectWorkBreakdownStructureElement is the upper boundary of the ProjectWorkBreakdownStructureElementID identifier interval. SelectionByProductionOrderTypeCode, which can be optional, is a range of ProductionOrderType Codes. InclusionExclusionCode is a coded representation of the inclusion of a set into a result set or the exclusion of it. IntervalBoundaryTypeCode is a coded representation of an interval boundary type. LowerBoundaryProductionOrderTypeCode is a coded representation of a ProductionOrderType. The LowerBoundaryProductionOrderType is the lower boundary of the ProductionOrderTypeCode interval. UpperBoundaryProductionOrderTypeCode, which can be optional, is a coded representation of a ProductionOrderType. The UpperBoundaryProductionOrderType is the upper boundary of the ProductionOrderTypeCode identifier interval. ERPProductionOrderRequiredIndicator. ERPProductionOrderRequiredIndicator specifies whether ERP production orders are required by this selection or not. ERPProcessOrderRequiredIndicator. ERPProcessOrderRequiredIndicator specifies whether ERP process orders are required by this selection or not. If ERPProcessOrderRequiredIndicator is active but ERPProductionOrderRequiredIndicator is not active SelectionByProjectWorkBreakdownStructureElementID is not allowed.

Message Data Type

The message data type ProductionOrderSimpleByElementsResponseMessage_sync contains the ProductionOrderSimpleByElementsResponse included in the business document and the business information that is relevant for sending a business document in a message. FIG. 440 shows a ProductionOrderSimpleByElementsResponseMessage 440000 package. The ProductionOrderSimpleByElementsResponseMessage 440000 package is a ProductionOrderSimpleByElementsResponseMessage 440004 datatype. The ProductionOrderSimpleByElementsResponseMessage 440000 package includes a ProductionOrderSimpleByElementsResponseMessage 440002 entity. The ProductionOrderSimpleByElementsResponseMessage 440000 package includes various packages, namely MessageHeader 440006, ProductionOrder 440014 and Log 440026.

The MessageHeader 440006 package is a BasicBusinessDocumentMessageHeader 440012 datatype. The MessageHeader 440006 package includes a MessageHeader 440008 entity.

The MessageHeader 440008 entity has a cardinality of zero or one 440010 meaning that for each instance of the ProductionOrderSimpleByElementsResponseMessage 440002 entity there may be one MessageHeader 440008 entity.

The ProductionOrder 440014 package includes a ProductionOrder 440016 entity.

The ProductionOrder 440016 entity has a cardinality of zero or n 440018 meaning that for each instance of the ProductionOrderSimpleByElementsResponseMessage 440002 entity there may be one or more ProductionOrder 440016 entities. The ProductionOrder 440016 entity includes an ID 440020 attribute.

The ID 440020 attribute is a ProductionOrderID 440024 datatype. The ID 440020 attribute has a cardinality of one 440022 meaning that for each instance of the ProductionOrder 440016 entity there is one ID 440020 attribute.

The Log 440026 package is a Log 440032 datatype. The Log 440026 package includes a Log 440028 entity.

The Log 440028 entity has a cardinality of one 440030 meaning that for each instance of the ProductionOrderSimpleByElementsResponseMessage 440002 entity there is one Log 440028 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

ProductionOrder Package

ProductionOrder package contains the identifiers of the production orders to be returned by this message.

ProductionOrder

ProductionOrder is an order to produce a certain amount of one or more materials in a certain time frame. ProductionOrderID is the unique identifier of a production order.

Log Package

Log

A log is a sequence of messages that may result from the execution of an application task.

Message Data Type

The message data type ProductionOrderSimpleByWorkCentreQueryMessage_sync contains the ProductionOrderSimpleByWorkCentreQuery included in the business document and the business information that is relevant for sending a business document in a message. FIGS. 441-1 through 441-3 show a ProductionOrderSimpleByWorkCentreQueryMessage 441000 package. The ProductionOrderSimpleByWorkCentreQueryMessage 441000 package is a ProductionOrderSimpleByWorkCentreQueryMessage 441004 datatype. The ProductionOrderSimpleByWorkCentreQueryMessage 441000 package includes a ProductionOrderSimpleByWorkCentreQueryMessage 441002 entity. The ProductionOrderSimpleByWorkCentreQueryMessage 441000 package includes various packages, namely MessageHeader 441006 and ProductionOrderSimpleSelectionByWorkCentre 441014.

The MessageHeader 441006 package is a BasicBusinessDocumentMessageHeader 441012 datatype. The MessageHeader 441006 package includes a MessageHeader 441008 entity.

The MessageHeader 441008 entity has a cardinality of zero or one 441010 meaning that for each instance of the ProductionOrderSimpleByWorkCentreQueryMessage 441002 entity there may be one MessageHeader 441008 entity.

The ProductionOrderSimpleSelectionByWorkCentre 441014 package includes a ProductionOrderSimpleSelectionByWorkCentre 441016 entity.

The ProductionOrderSimpleSelectionByWorkCentre 441016 entity has a cardinality of one 441018 meaning that for each instance of the ProductionOrderSimpleByWorkCentreQueryMessage 441002 entity there is one ProductionOrderSimpleSelectionByWorkCentre 441016 entity. The ProductionOrderSimpleSelectionByWorkCentre 441016 entity includes various attributes, namely ERPProductionOrderRequiredIndicator 441020 and ERPProcessOrderRequiredIndicator 441026. The ProductionOrderSimpleSelectionByWorkCentre 441016 entity has various subordinate entities, namely SelectionByWorkCentreID 441032 and SelectionByPlantID 441056.

The ERPProductionOrderRequiredIndicator 441020 attribute is an Indicator 441024 datatype. The ERPProductionOrderRequiredIndicator 441020 attribute has a cardinality of one 441022 meaning that for each instance of the ProductionOrderSimpleSelectionByWorkCentre 441016 entity there is one ERPProductionOrderRequiredIndicator 441020 attribute.

The ERPProcessOrderRequiredIndicator 441026 attribute is an Indicator 441030 datatype. The ERPProcessOrderRequiredIndicator 441026 attribute has a cardinality of one 441028 meaning that for each instance of the ProductionOrderSimpleSelectionByWorkCentre 441016 entity there is one ERPProcessOrderRequiredIndicator 441026 attribute.

The SelectionByWorkCentreID 441032 entity has a cardinality of zero or n 441034 meaning that for each instance of the ProductionOrderSimpleSelectionByWorkCentre 441016 entity there may be one or more SelectionByWorkCentreID 441032 entities. The SelectionByWorkCentreID 441032 entity has various subordinate entities, namely InclusionExclusionCode 441036, IntervalBoundaryTypeCode 441040, LowerBoundaryWorkCentreID 441044 and UpperBoundaryWorkCentreID 441050.

The InclusionExclusionCode 441036 entity has a cardinality of one 441038 meaning that for each instance of the SelectionByWorkCentreID 441032 entity there is one InclusionExclusionCode 441036 entity.

The IntervalBoundaryTypeCode 441040 entity has a cardinality of one 441042 meaning that for each instance of the SelectionByWorkCentreID 441032 entity there is one IntervalBoundaryTypeCode 441040 entity.

The LowerBoundaryWorkCentreID 441044 entity has a cardinality of one 441046 meaning that for each instance of the SelectionByWorkCentreID 441032 entity there is one LowerBoundaryWorkCentreID 441044 entity.

The UpperBoundaryWorkCentreID 441050 entity has a cardinality of zero or one 441052 meaning that for each instance of the SelectionByWorkCentreID 441032 entity there may be one UpperBoundaryWorkCentreID 441050 entity.

The SelectionByPlantID 441056 entity has a cardinality of zero or n 441058 meaning that for each instance of the ProductionOrderSimpleSelectionByWorkCentre 441016 entity there may be one or more SelectionByPlantID 441056 entities. The SelectionByPlantID 441056 entity has various subordinate entities, namely InclusionExclusionCode 441060, IntervalBoundaryTypeCode 441064, LowerBoundaryPlantID 441068 and UpperBoundaryPlantID 441074.

The InclusionExclusionCode 441060 entity has a cardinality of one 441062 meaning that for each instance of the SelectionByPlantID 441056 entity there is one InclusionExclusionCode 441060 entity.

The IntervalBoundaryTypeCode 441064 entity has a cardinality of one 441066 meaning that for each instance of the SelectionByPlantID 441056 entity there is one IntervalBoundaryTypeCode 441064 entity.

The LowerBoundaryPlantID 441068 entity has a cardinality of one 441070 meaning that for each instance of the SelectionByPlantID 441056 entity there is one LowerBoundaryPlantID 441068 entity.

The UpperBoundaryPlantID 441074 entity has a cardinality of zero or one 441076 meaning that for each instance of the SelectionByPlantID 441056 entity there may be one UpperBoundaryPlantID 441074 entity.

MessageHeader Package

Selection Package

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader, which can be optional, is a collection of identification data of an instance of a business document message, or reference data to another instance of a business document message, or both. The subject of the identification data is the message instance that conveys them, whereas the reference data are related to a different message instance previously exchanged between the same interaction parties.

Selection Package

ProductionOrderSimpleSelectionByWorkCentre

ProductionOrderSimpleSelectionByWorkCentre contains the selection criteria for the query. SelectionByWorkCentreID, which can be optional, is a range of WorkCentre Identifiers. InclusionExclusionCode is a coded representation of the inclusion of a set into a result set or the exclusion of it. IntervalBoundaryTypeCode is a coded representation of an interval boundary type. LowerBoundaryWorkCentreID is a unique identifier for a WorkCentre. The LowerBoundaryWorkCentre is the lower boundary of the WorkCentreID identifier interval. UpperBoundaryWorkCentreID, which is optional, is a unique identifier for a WorkCentre the production order is assigned to. The UpperBoundary WorkCentre is the upper boundary of the WorkCentre ID identifier interval. SelectionByPlantID, which is optional, is a range of Plant Identifiers. InclusionExclusionCode is a coded representation of the inclusion of a set into a result set or the exclusion of it. IntervalBoundaryTypeCode is a coded representation of an interval boundary type. LowerBoundaryPlantID is a unique identifier for the corresponding plant of a work centre. The LowerBoundaryPlant is the lower boundary of the PlantID identifier interval. UpperBoundaryPlantID, which is optional, is a unique identifier for the corresponding plant of a work centre. The UpperBoundaryPlant is the upper boundary of the PlantID identifier interval. ERPProductionOrderRequiredIndicator specifies whether ERP production orders are required by this selection or not. ERPProcessOrderRequiredIndicator specifies whether ERP process orders are required by this selection or not.

If SelectionByWorkCentreID is provided, SelectionByPlantID becomes mandatory since WorkCentre ID is unique only in context of a PlantID. If SelectionByWorkCentreID is not provided, SelectionByPlantID can not be used.

Message Data Type

The message data type ProductionOrderSimpleByWorkCentreResponseMessage_sync contains the ProductionOrderSimpleByWorkCentreResponse included in the business document and the business information that is relevant for sending a business document in a message. FIG. 442 shows a ProductionOrderSimpleByWorkCentreResponseMessage 442000 package. The ProductionOrderSimpleByWorkCentreResponseMessage 442000 package is a ProductionOrderSimpleByWorkCentreResponseMessage 442004 datatype. The ProductionOrderSimpleByWorkCentreResponseMessage 442000 package includes a ProductionOrderSimpleByWorkCentreResponseMessage 442002 entity. The ProductionOrderSimpleByWorkCentreResponseMessage 442000 package includes various packages, namely MessageHeader 442006, ProductionOrder 442014 and Log 442026.

The MessageHeader 442006 package is a BasicBusinessDocumentMessageHeader 442012 datatype. The MessageHeader 442006 package includes a MessageHeader 442008 entity.

The MessageHeader 442008 entity has a cardinality of zero or one 442010 meaning that for each instance of the ProductionOrderSimpleByWorkCentreResponseMessage 442002 entity there may be one MessageHeader 442008 entity.

The ProductionOrder 442014 package includes a ProductionOrder 442016 entity.

The ProductionOrder 442016 entity has a cardinality of zero or n 442018 meaning that for each instance of the ProductionOrderSimpleByWorkCentreResponseMessage 442002 entity there may be one or more ProductionOrder 442016 entities. The ProductionOrder 442016 entity includes an ID 442020 attribute.

The ID 442020 attribute is a ProductionOrderID 442024 datatype. The ID 442020 attribute has a cardinality of one 442022 meaning that for each instance of the ProductionOrder 442016 entity there is one ID 442020 attribute.

The Log 442026 package is a Log 442032 datatype. The Log 442026 package includes a Log 442028 entity.

The Log 442028 entity has a cardinality of one 442030 meaning that for each instance of the ProductionOrderSimpleByWorkCentreResponseMessage 442002 entity there is one Log 442028 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader, which is optional, is a collection of identification data of an instance of a business document message, or reference data to another instance of a business document message, or both. The subject of the identification data is the message instance that conveys them, whereas the reference data are related to a different message instance previously exchanged between the same interaction parties.

ProductionOrder Package

ProductionOrder package contains the identifiers of the production orders to be returned by this message.

ProductionOrder

ProductionOrder is an order to produce a certain amount of one or more materials in a certain time frame. ProductionOrderID is the unique identifier of a production order.

Log Package

Log

A log is a sequence of messages that may result from the execution of an application task.

Message Data Type

The message data type ProductionOrderByIDQueryMessage_sync contains the ProductionOrderByIDQuery included in the business document and the business information that is relevant for sending a business document in a message. FIG. 437 shows a ProductionOrderByIDQueryMessage 437000 package. The ProductionOrderByIDQueryMessage 437000 package is a ProductionOrderByIDQueryMessage 437004 datatype. The ProductionOrderByIDQueryMessage 437000 package includes a ProductionOrderByIDQueryMessage 437002 entity. The ProductionOrderByIDQueryMessage 437000 package includes various packages, namely MessageHeader 437006 and ProductionOrderSelectionByID 437014.

The MessageHeader 437006 package is a BasicBusinessDocumentMessageHeader 437012 datatype. The MessageHeader 437006 package includes a MessageHeader 437008 entity.

The MessageHeader 437008 entity has a cardinality of zero or one 437010 meaning that for each instance of the ProductionOrderByIDQueryMessage 437002 entity there may be one MessageHeader 437008 entity.

The ProductionOrderSelectionByID 437014 package includes a ProductionOrderSelectionByID 437016 entity.

The ProductionOrderSelectionByID 437016 entity has a cardinality of one 437018 meaning that for each instance of the ProductionOrderByIDQueryMessage 437002 entity there is one ProductionOrderSelectionByID 437016 entity. The ProductionOrderSelectionByID 437016 entity includes an ID 437020 attribute.

The ID 437020 attribute is a ProductionOrderID 437024 datatype. The ID 437020 attribute has a cardinality of one 437022 meaning that for each instance of the ProductionOrderSelectionByID 437016 entity there is one ID 437020 attribute.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader, which is optional, is a collection of identification data of an instance of a business document message, or reference data to another instance of a business document message, or both. The subject of the identification data is the message instance that conveys them, whereas the reference data are related to a different message instance previously exchanged between the same interaction parties.

Selection Package

ProductionOrderSelectionByID

ProductionOrderSelectionByID contains the production order ID (key field) of the production order to be used as query to Production. SelectionByID contains the ProductionOrderID.

Message Data Type

The message data type ProductionOrderByIDResponseMessage_sync contains the ProductionOrderByIDResponse included in the business document and the business information that is relevant for sending a business document in a message. FIGS. 438-1 through 438-39 show a ProductionOrderByIDResponseMessage 438000 package. The ProductionOrderByIDResponseMessage 438000 package is a ProductionOrderByIDResponseMessage 438004 datatype. The ProductionOrderByIDResponseMessage 438000 package includes a ProductionOrderByIDResponseMessage 438002 entity. The ProductionOrderByIDResponseMessage 438000 package includes various packages, namely MessageHeader 438006, ProductionOrder 438014 and Log 43801016.

The MessageHeader 438006 package is a BasicBusinessDocumentMessageHeader 438012 datatype. The MessageHeader 438006 package includes a MessageHeader 438008 entity.

The MessageHeader 438008 entity has a cardinality of zero or one 438010 meaning that for each instance of the ProductionOrderByIDResponseMessage 438002 entity there may be one MessageHeader 438008 entity.

The ProductionOrder 438014 package includes a ProductionOrder 438016 entity. The ProductionOrder 438014 package includes various packages, namely Item 4380218 and Sequence 4380320.

The ProductionOrder 438016 entity has a cardinality of one 438018 meaning that for each instance of the ProductionOrderByIDResponseMessage 438002 entity there is one ProductionOrder 438016 entity. The ProductionOrder 438016 entity includes various attributes, namely ID 438020, PlantID 438026, SupplyPlanningAreaID 438032, MaterialRequirementPlanningControllerID 438038, ProductionSchedulerID 438044, MaterialInternalID 438050, ReservationID 438056, ProductionConfirmationGroupID 438062, LeadingProductionOrderID 438068, SalesOrderID 438074, SalesOrderItemID 438080, CreationUserAccountID 438086, ProjectWorkBreakdownStructureElementID 438092, ImportanceCode 438098, TypeCode 4380104, TypeName 4380110, MaterialDescription 4380116, DeletedIndicator 4380122, AggregationIndicator 4380128, ProductionConfirmationNumberValue 4380134, CreationDate 4380140, ExplorationDate 4380146, ScheduledReleaseDate 4380152, ActualReleasedDate 4380158, PlannedStartDateTime 4380164, PlannedEndDateTime 4380170, ConfirmedStartDateTime 4380176, ConfirmedEndDateTime 4380182, ScheduledStartDateTime 4380188, ScheduledEndDateTime 4380194, PlannedQuantity 4380200, ExpectedScrapQuantity 4380206 and AvailableQuantity 4380212.

The ID 438020 attribute is a ProductionOrderID 438024 datatype. The ID 438020 attribute has a cardinality of one 438022 meaning that for each instance of the ProductionOrder 438016 entity there is one ID 438020 attribute.

The PlantID 438026 attribute is a PlantID 438030 datatype. The PlantID 438026 attribute has a cardinality of one 438028 meaning that for each instance of the ProductionOrder 438016 entity there is one PlantID 438026 attribute.

The SupplyPlanningAreaID 438032 attribute is a SupplyPlanningAreaID 438036 datatype. The SupplyPlanningAreaID 438032 attribute has a cardinality of one 438034 meaning that for each instance of the ProductionOrder 438016 entity there is one SupplyPlanningAreaID 438032 attribute.

The MaterialRequirementPlanningControllerID 438038 attribute is a PartyInternalID 438042 datatype. The MaterialRequirementPlanningControllerID 438038 attribute has a cardinality of zero or one 438040 meaning that for each instance of the ProductionOrder 438016 entity there may be one MaterialRequirementPlanningControllerID 438038 attribute.

The ProductionSchedulerID 438044 attribute is a PartyInternalID 438048 datatype. The ProductionSchedulerID 438044 attribute has a cardinality of zero or one 438046 meaning that for each instance of the ProductionOrder 438016 entity there may be one ProductionSchedulerID 438044 attribute.

The MaterialInternalID 438050 attribute is a ProductInternalID 438054 datatype. The MaterialInternalID 438050 attribute has a cardinality of zero or one 438052 meaning that for each instance of the ProductionOrder 438016 entity there may be one MaterialInternalID 438050 attribute.

The ReservationID 438056 attribute is a ReservationID 438060 datatype. The ReservationID 438056 attribute has a cardinality of zero or one 438058 meaning that for each instance of the ProductionOrder 438016 entity there may be one ReservationID 438056 attribute.

The ProductionConfirmationGroupID 438062 attribute is a ProductionConfirmationGroupID 438066 datatype. The ProductionConfirmationGroupID 438062 attribute has a cardinality of zero or one 438064 meaning that for each instance of the ProductionOrder 438016 entity there may be one ProductionConfirmationGroupID 438062 attribute.

The LeadingProductionOrderID 438068 attribute is a ProductionOrderID 438072 datatype. The LeadingProductionOrderID 438068 attribute has a cardinality of zero or one 438070 meaning that for each instance of the ProductionOrder 438016 entity there may be one LeadingProductionOrderID 438068 attribute.

The SalesOrderID 438074 attribute is a SalesOrderID 438078 datatype. The SalesOrderID 438074 attribute has a cardinality of zero or one 438076 meaning that for each instance of the ProductionOrder 438016 entity there may be one SalesOrderID 438074 attribute.

The SalesOrderItemID 438080 attribute is a SalesOrderItemID 438084 datatype. The SalesOrderItemID 438080 attribute has a cardinality of zero or one 438082 meaning that for each instance of the ProductionOrder 438016 entity there may be one SalesOrderItemID 438080 attribute.

The CreatiorUserAccountID 438086 attribute is an UserAccountID 438090 datatype. The CreatiorUserAccountID 438086 attribute has a cardinality of one 438088 meaning that for each instance of the ProductionOrder 438016 entity there is one CreatiorUserAccountID 438086 attribute.

The ProjectWorkBreakdownStructureElementID 438092 attribute is a ProjectWorkBreakdownStructureElementID 438096 datatype. The ProjectWorkBreakdownStructureElementID 438092 attribute has a cardinality of zero or one 438094 meaning that for each instance of the ProductionOrder 438016 entity there may be one ProjectWorkBreakdownStructureElementID 438092 attribute.

The ImportanceCode 438098 attribute is an ImportanceCode 4380102 datatype. The ImportanceCode 438098 attribute has a cardinality of zero or one 4380100 meaning that for each instance of the ProductionOrder 438016 entity there may be one ImportanceCode 438098 attribute.

The TypeCode 4380104 attribute is a ProductionOrderTypeCode 4380108 datatype. The TypeCode 4380104 attribute has a cardinality of one 4380106 meaning that for each instance of the ProductionOrder 438016 entity there is one TypeCode 4380104 attribute.

The TypeName 4380110 attribute is a ProductionOrderTypeName 4380114 datatype. The TypeName 4380110 attribute has a cardinality of one 4380112 meaning that for each instance of the ProductionOrder 438016 entity there is one TypeName 4380110 attribute.

The MaterialDescription 4380116 attribute is a ProductDescription 4380120 datatype. The MaterialDescription 4380116 attribute has a cardinality of zero or one 4380118 meaning that for each instance of the ProductionOrder 438016 entity there may be one MaterialDescription 4380116 attribute.

The DeletedIndicator 4380122 attribute is an Indicator 4380126 datatype. The DeletedIndicator 4380122 attribute has a cardinality of zero or one 4380124 meaning that for each instance of the ProductionOrder 438016 entity there may be one DeletedIndicator 4380122 attribute.

The AggregationIndicator 4380128 attribute is an Indicator 4380132 datatype. The AggregationIndicator 4380128 attribute has a cardinality of zero or one 4380130 meaning that for each instance of the ProductionOrder 438016 entity there may be one AggregationIndicator 4380128 attribute.

The ProductionConfirmationNumberValue 4380134 attribute is a NumberValue 4380138 datatype. The ProductionConfirmationNumberValue 4380134 attribute has a cardinality of zero or one 4380136 meaning that for each instance of the ProductionOrder 438016 entity there may be one ProductionConfirmationNumberValue 4380134 attribute.

The CreationDate 4380140 attribute is a Date 4380144 datatype. The CreationDate 4380140 attribute has a cardinality of one 4380142 meaning that for each instance of the ProductionOrder 438016 entity there is one CreationDate 4380140 attribute.

The ExplorationDate 4380146 attribute is a Date 4380150 datatype. The ExplorationDate 4380146 attribute has a cardinality of zero or one 4380148 meaning that for each instance of the ProductionOrder 438016 entity there may be one ExplorationDate 4380146 attribute.

The ScheduledReleaseDate 4380152 attribute is a Date 4380156 datatype. The ScheduledReleaseDate 4380152 attribute has a cardinality of one 4380154 meaning that for each instance of the ProductionOrder 438016 entity there is one ScheduledReleaseDate 4380152 attribute.

The ActualReleasedDate 4380158 attribute is a Date 4380162 datatype. The ActualReleasedDate 4380158 attribute has a cardinality of one 4380160 meaning that for each instance of the ProductionOrder 438016 entity there is one ActualReleasedDate 4380158 attribute.

The PlannedStartDateTime 4380164 attribute is a DateTime 4380168 datatype. The PlannedStartDateTime 4380164 attribute has a cardinality of one 4380166 meaning that for each instance of the ProductionOrder 438016 entity there is one PlannedStartDateTime 4380164 attribute.

The PlannedEndDateTime 4380170 attribute is a DateTime 4380174 datatype. The PlannedEndDateTime 4380170 attribute has a cardinality of one 4380172 meaning that for each instance of the ProductionOrder 438016 entity there is one PlannedEndDateTime 4380170 attribute.

The ConfirmedStartDateTime 4380176 attribute is a DateTime 4380180 datatype. The ConfirmedStartDateTime 4380176 attribute has a cardinality of one 4380178 meaning that for each instance of the ProductionOrder 438016 entity there is one ConfirmedStartDateTime 4380176 attribute.

The ConfirmedEndDateTime 4380182 attribute is a DateTime 4380186 datatype. The ConfirmedEndDateTime 4380182 attribute has a cardinality of one 4380184 meaning that for each instance of the ProductionOrder 438016 entity there is one ConfirmedEndDateTime 4380182 attribute.

The ScheduledStartDateTime 4380188 attribute is a DateTime 4380192 datatype. The ScheduledStartDateTime 4380188 attribute has a cardinality of one 4380190 meaning that for each instance of the ProductionOrder 438016 entity there is one ScheduledStartDateTime 4380188 attribute.

The ScheduledEndDateTime 4380194 attribute is a DateTime 4380198 datatype. The ScheduledEndDateTime 4380194 attribute has a cardinality of one 4380196 meaning that for each instance of the ProductionOrder 438016 entity there is one ScheduledEndDateTime 4380194 attribute.

The PlannedQuantity 4380200 attribute is a Quantity 4380204 datatype. The PlannedQuantity 4380200 attribute has a cardinality of one 4380202 meaning that for each instance of the ProductionOrder 438016 entity there is one PlannedQuantity 4380200 attribute.

The ExpectedScrapQuantity 4380206 attribute is a Quantity 4380210 datatype. The ExpectedScrapQuantity 4380206 attribute has a cardinality of zero or one 4380208 meaning that for each instance of the ProductionOrder 438016 entity there may be one ExpectedScrapQuantity 4380206 attribute.

The AvailableQuantity 4380212 attribute is a Quantity 4380216 datatype. The AvailableQuantity 4380212 attribute has a cardinality of zero or one 4380214 meaning that for each instance of the ProductionOrder 438016 entity there may be one AvailableQuantity 4380212 attribute.

The Item 4380218 package includes an Item 4380220 entity.

The Item 4380220 entity has a cardinality of one or n 4380222 meaning that for each instance of the ProductionOrder 438016 entity there are one or more Item 4380220 entities. The Item 4380220 entity includes various attributes, namely ID 4380224, PlantID 4380230, SupplyPlanningAreaID 4380236, MaterialRequirementSupplyPlanningAreaID 4380242, ProductionVersionID 4380248, MaterialInternalID 4380254, InventoryManagedLocationInternalID 4380260, BatchID 4380266, MaterialDescription 4380272, DeliveryCompletedIndicator 4380278, DeletedIndicator 4380284, PlannedDeliveryDate 4380290, ConfirmedDeliveryDate 4380296, PlannedQuantity 4380302, ExpectedScrapQuantity 4380308 and DeliveredQuantity 4380314.

The ID 4380224 attribute is a ProductionOrderItemID 4380228 datatype. The ID 4380224 attribute has a cardinality of one 4380226 meaning that for each instance of the Item 4380220 entity there is one ID 4380224 attribute.

The PlantID 4380230 attribute is a PlantID 4380234 datatype. The PlantID 4380230 attribute has a cardinality of one 4380232 meaning that for each instance of the Item 4380220 entity there is one PlantID 4380230 attribute.

The SupplyPlanningAreaID 4380236 attribute is a SupplyPlanningAreaID 4380240 datatype. The SupplyPlanningAreaID 4380236 attribute has a cardinality of one 4380238 meaning that for each instance of the Item 4380220 entity there is one SupplyPlanningAreaID 4380236 attribute.

The MaterialRequirementSupplyPlanningAreaID 4380242 attribute is a SupplyPlanningAreaID 4380246 datatype. The MaterialRequirementSupplyPlanningAreaID 4380242 attribute has a cardinality of zero or one 4380244 meaning that for each instance of the Item 4380220 entity there may be one MaterialRequirementSupplyPlanningAreaID 4380242 attribute.

The ProductionVersionID 4380248 attribute is a ProductionVersionID 4380252 datatype. The ProductionVersionID 4380248 attribute has a cardinality of zero or one 4380250 meaning that for each instance of the Item 4380220 entity there may be one ProductionVersionID 4380248 attribute.

The MaterialInternalID 4380254 attribute is a ProductInternalID 4380258 datatype. The MaterialInternalID 4380254 attribute has a cardinality of zero or one 4380256 meaning that for each instance of the Item 4380220 entity there may be one MaterialInternalID 4380254 attribute.

The InventoryManagedLocationInternalID 4380260 attribute is a LocationInternalID 4380264 datatype. The InventoryManagedLocationInternalID 4380260 attribute has a cardinality of zero or one 4380262 meaning that for each instance of the Item 4380220 entity there may be one InventoryManagedLocationInternalID 4380260 attribute.

The BatchID 4380266 attribute is a BatchID 4380270 datatype. The BatchID 4380266 attribute has a cardinality of zero or one 4380268 meaning that for each instance of the Item 4380220 entity there may be one BatchID 4380266 attribute.

The MaterialDescription 4380272 attribute is a ProductDescription 4380276 datatype. The MaterialDescription 4380272 attribute has a cardinality of zero or one 4380274 meaning that for each instance of the Item 4380220 entity there may be one MaterialDescription 4380272 attribute.

The DeliveryCompletedIndicator 4380278 attribute is an Indicator 4380282 datatype. The DeliveryCompletedIndicator 4380278 attribute has a cardinality of zero or one 4380280 meaning that for each instance of the Item 4380220 entity there may be one DeliveryCompletedIndicator 4380278 attribute.

The DeletedIndicator 4380284 attribute is an Indicator 4380288 datatype. The DeletedIndicator 4380284 attribute has a cardinality of zero or one 4380286 meaning that for each instance of the Item 4380220 entity there may be one DeletedIndicator 4380284 attribute.

The PlannedDeliveryDate 4380290 attribute is a Date 4380294 datatype. The PlannedDeliveryDate 4380290 attribute has a cardinality of one 4380292 meaning that for each instance of the Item 4380220 entity there is one PlannedDeliveryDate 4380290 attribute.

The ConfirmedDeliveryDate 4380296 attribute is a Date 4380300 datatype. The ConfirmedDeliveryDate 4380296 attribute has a cardinality of zero or one 4380298 meaning that for each instance of the Item 4380220 entity there may be one ConfirmedDeliveryDate 4380296 attribute.

The PlannedQuantity 4380302 attribute is a Quantity 4380306 datatype. The PlannedQuantity 4380302 attribute has a cardinality of one 4380304 meaning that for each instance of the Item 4380220 entity there is one PlannedQuantity 4380302 attribute.

The ExpectedScrapQuantity 4380308 attribute is a Quantity 4380312 datatype. The ExpectedScrapQuantity 4380308 attribute has a cardinality of zero or one 4380310 meaning that for each instance of the Item 4380220 entity there may be one ExpectedScrapQuantity 4380308 attribute.

The DeliveredQuantity 4380314 attribute is a Quantity 4380318 datatype. The DeliveredQuantity 4380314 attribute has a cardinality of zero or one 4380316 meaning that for each instance of the Item 4380220 entity there may be one DeliveredQuantity 4380314 attribute.

The Sequence 4380320 package includes a Sequence 4380322 entity. The Sequence 4380320 package includes an Operation 4380392 package.

The Sequence 4380322 entity has a cardinality of one or n 4380324 meaning that for each instance of the ProductionOrder 438016 entity there are one or more Sequence 4380322 entities. The Sequence 4380322 entity includes various attributes, namely ID 4380326, BranchingOperationID 4380332, ReturningOperationID 4380338, ProductionBillOfOperationsGroupID 4380344, ProductionBillOfOperationsID 4380350, ProductionBillOfOperationsTypeCode 4380356, CategoryCode 4380362, CategoryName 4380368, Description 4380374, LotSizeMinimumQuantity 4380380 and LotSizeMaximumQuantity 4380386.

The ID 4380326 attribute is a ProductionOrderSequenceID 4380330 datatype. The ID 4380326 attribute has a cardinality of one 4380328 meaning that for each instance of the Sequence 4380322 entity there is one ID 4380326 attribute.

The BranchingOperationID 4380332 attribute is an OperationID 4380336 datatype. The BranchingOperationID 4380332 attribute has a cardinality of zero or one 4380334 meaning that for each instance of the Sequence 4380322 entity there may be one BranchingOperationID 4380332 attribute.

The ReturningOperationID 4380338 attribute is an OperationID 4380342 datatype. The ReturningOperationID 4380338 attribute has a cardinality of zero or one 4380340 meaning that for each instance of the Sequence 4380322 entity there may be one ReturningOperationID 4380338 attribute.

The ProductionBillOfOperationsGroupID 4380344 attribute is a ProductionBillOfOperationsGroupID 4380348 datatype. The ProductionBillOfOperationsGroupID 4380344 attribute has a cardinality of zero or one 4380346 meaning that for each instance of the Sequence 4380322 entity there may be one ProductionBillOfOperationsGroupID 4380344 attribute.

The ProductionBillOfOperationsID 4380350 attribute is a ProductionBillOfOperationsID 4380354 datatype. The ProductionBillOfOperationsID 4380350 attribute has a cardinality of zero or one 4380352 meaning that for each instance of the Sequence 4380322 entity there may be one ProductionBillOfOperationsID 4380350 attribute.

The ProductionBillOfOperationsTypeCode 4380356 attribute is a ProductionBillOfOperationsTypeCode 4380360 datatype. The ProductionBillOfOperationsTypeCode 4380356 attribute has a cardinality of zero or one 4380358 meaning that for each instance of the Sequence 4380322 entity there may be one ProductionBillOfOperationsTypeCode 4380356 attribute.

The CategoryCode 4380362 attribute is a ProductionOrderSequenceCategoryCode 4380366 datatype. The CategoryCode 4380362 attribute has a cardinality of one 4380364 meaning that for each instance of the Sequence 4380322 entity there is one CategoryCode 4380362 attribute.

The CategoryName 4380368 attribute is a ProductionOrderSequenceCategoryName 4380372 datatype. The CategoryName 4380368 attribute has a cardinality of one 4380370 meaning that for each instance of the Sequence 4380322 entity there is one CategoryName 4380368 attribute.

The Description 4380374 attribute is a SHORT_description 4380378 datatype. The Description 4380374 attribute has a cardinality of zero or one 4380376 meaning that for each instance of the Sequence 4380322 entity there may be one Description 4380374 attribute.

The LotSizeMinimumQuantity 4380380 attribute is a Quantity 4380384 datatype. The LotSizeMinimumQuantity 4380380 attribute has a cardinality of zero or one 4380382 meaning that for each instance of the Sequence 4380322 entity there may be one LotSizeMinimumQuantity 4380380 attribute.

The LotSizeMaximumQuantity 4380386 attribute is a Quantity 4380390 datatype. The LotSizeMaximumQuantity 4380386 attribute has a cardinality of zero or one 4380388 meaning that for each instance of the Sequence 4380322 entity there may be one LotSizeMaximumQuantity 4380386 attribute.

The Operation 4380392 package includes an Operation 4380394 entity.

The Operation 4380394 entity has a cardinality of one or n 4380396 meaning that for each instance of the Sequence 4380322 entity there are one or more Operation 4380394 entities. The Operation 4380394 entity includes various attributes, namely ID 4380398, SequenceID 4380404, ProductionConfirmationGroupID 4380410, PurchaseRequestID 4380416, PurchaseRequestItemID 4380422, WorkCentreID 4380428, PlantID 4380434, FirstProductionResourceClassID 4380440, SecondProductionResourceClassID 4380446, ThirdProductionResourceClassID 4380452, FourthProductionResourceClassID 4380458, FifthProductionResourceClassID 4380464, SixthProductionResourceClassID 4380470, ProductionBillOfOperationsGroupID 4380476, ProductionBillOfOperationsID 4380482, ProductionBillOfOperationsTypeCode 4380488, ControlProfileCode 4380494, ControlProfileName 4380500, WorkCentreName 4380506, Description 4380512, AdditionalDescription 4380518, ProductionConfirmationNumberValue 4380524, EarliestScheduledExecutionStartDateTime 4380530, EarliestScheduledProcessingStartDateTime 4380536, EarliestScheduledTeardownStartDateTime 4380542, EarliestScheduledExecutionEndDateTime 4380548, LatestScheduledExecutionDateTimePeriod 4380554, LatestScheduledProcessingStartDateTime 4380560, LatestScheduledTeardownStartDateTime 4380566, LatestScheduledExecutionEndDateTime 4380572, PlannedQuantity 4380578 and ExpectedScrapQuantity 4380584. The Operation 4380394 entity has various subordinate entities, namely PredecessorSuccessorRelationship 4380590, MaterialInput 4380638, MaterialOutput 4380834 and EventTriggerPoint 4380976.

The ID 4380398 attribute is an OperationID 4380402 datatype. The ID 4380398 attribute has a cardinality of one 4380400 meaning that for each instance of the Operation 4380394 entity there is one ID 4380398 attribute.

The SequenceID 4380404 attribute is a ProductionOrderSequenceID 4380408 datatype. The SequenceID 4380404 attribute has a cardinality of one 4380406 meaning that for each instance of the Operation 4380394 entity there is one SequenceID 4380404 attribute.

The ProductionConfirmationGroupID 4380410 attribute is a ProductionConfirmationGroupID 4380414 datatype. The ProductionConfirmationGroupID 4380410 attribute has a cardinality of one 4380412 meaning that for each instance of the Operation 4380394 entity there is one ProductionConfirmationGroupID 4380410 attribute.

The PurchaseRequestID 4380416 attribute is a PurchaseRequestID 4380420 datatype. The PurchaseRequestID 4380416 attribute has a cardinality of zero or one 4380418 meaning that for each instance of the Operation 4380394 entity there may be one PurchaseRequestID 4380416 attribute.

The PurchaseRequestItemID 4380422 attribute is a PurchaseRequestItemID 4380426 datatype. The PurchaseRequestItemID 4380422 attribute has a cardinality of zero or one 4380424 meaning that for each instance of the Operation 4380394 entity there may be one PurchaseRequestItemID 4380422 attribute.

The WorkCentreID 4380428 attribute is a WorkCentreID 4380432 datatype. The WorkCentreID 4380428 attribute has a cardinality of zero or one 4380430 meaning that for each instance of the Operation 4380394 entity there may be one WorkCentreID 4380428 attribute.

The PlantID 4380434 attribute is a PlantID 4380438 datatype. The PlantID 4380434 attribute has a cardinality of one 4380436 meaning that for each instance of the Operation 4380394 entity there is one PlantID 4380434 attribute.

The FirstProductionResourceClassID 4380440 attribute is a ResourceClassID 4380444 datatype. The FirstProductionResourceClassID 4380440 attribute has a cardinality of zero or one 4380442 meaning that for each instance of the Operation 4380394 entity there may be one FirstProductionResourceClassID 4380440 attribute.

The SecondProductionResourceClassID 4380446 attribute is a ResourceClassID 4380450 datatype. The SecondProductionResourceClassID 4380446 attribute has a cardinality of zero or one 4380448 meaning that for each instance of the Operation 4380394 entity there may be one SecondProductionResourceClassID 4380446 attribute.

The ThirdProductionResourceClassID 4380452 attribute is a ResourceClassID 4380456 datatype. The ThirdProductionResourceClassID 4380452 attribute has a cardinality of zero or one 4380454 meaning that for each instance of the Operation 4380394 entity there may be one ThirdProductionResourceClassID 4380452 attribute.

The FourthProductionResourceClassID 4380458 attribute is a ResourceClassID 4380462 datatype. The FourthProductionResourceClassID 4380458 attribute has a cardinality of zero or one 4380460 meaning that for each instance of the Operation 4380394 entity there may be one FourthProductionResourceClassID 4380458 attribute.

The FifthProductionResourceClassID 4380464 attribute is a ResourceClassID 4380468 datatype. The FifthProductionResourceClassID 4380464 attribute has a cardinality of zero or one 4380466 meaning that for each instance of the Operation 4380394 entity there may be one FifthProductionResourceClassID 4380464 attribute.

The SixthProductionResourceClassID 4380470 attribute is a ResourceClassID 4380474 datatype. The SixthProductionResourceClassID 4380470 attribute has a cardinality of zero or one 4380472 meaning that for each instance of the Operation 4380394 entity there may be one SixthProductionResourceClassID 4380470 attribute.

The ProductionBillOfOperationsGroupID 4380476 attribute is a ProductionBillOfOperationsGroupID 4380480 datatype. The ProductionBillOfOperationsGroupID 4380476 attribute has a cardinality of zero or one 4380478 meaning that for each instance of the Operation 4380394 entity there may be one ProductionBillOfOperationsGroupID 4380476 attribute.

The ProductionBillOfOperationsID 4380482 attribute is a ProductionBillOfOperationsID 4380486 datatype. The ProductionBillOfOperationsID 4380482 attribute has a cardinality of zero or one 4380484 meaning that for each instance of the Operation 4380394 entity there may be one ProductionBillOfOperationsID 4380482 attribute.

The ProductionBillOfOperationsTypeCode 4380488 attribute is a ProductionBillOfOperationsTypeCode 4380492 datatype. The ProductionBillOfOperationsTypeCode 4380488 attribute has a cardinality of zero or one 4380490 meaning that for each instance of the Operation 4380394 entity there may be one ProductionBillOfOperationsTypeCode 4380488 attribute.

The ControlProfileCode 4380494 attribute is an OperationControlProfileCode 4380498 datatype. The ControlProfileCode 4380494 attribute has a cardinality of one 4380496 meaning that for each instance of the Operation 4380394 entity there is one ControlProfileCode 4380494 attribute.

The ControlProfileName 4380500 attribute is an OperationControlProfileName 4380504 datatype. The ControlProfileName 4380500 attribute has a cardinality of one 4380502 meaning that for each instance of the Operation 4380394 entity there is one ControlProfileName 4380500 attribute.

The WorkCentreName 4380506 attribute is a WorkCentreName 4380510 datatype. The WorkCentreName 4380506 attribute has a cardinality of zero or one 4380508 meaning that for each instance of the Operation 4380394 entity there may be one WorkCentreName 4380506 attribute.

The Description 4380512 attribute is a SHORT_Description 4380516 datatype. The Description 4380512 attribute has a cardinality of zero or one 4380514 meaning that for each instance of the Operation 4380394 entity there may be one Description 4380512 attribute.

The AdditionalDescription 4380518 attribute is a SHORT_Description 4380522 datatype. The AdditionalDescription 4380518 attribute has a cardinality of zero or one 4380520 meaning that for each instance of the Operation 4380394 entity there may be one AdditionalDescription 4380518 attribute.

The ProductionConfirmationNumberValue 4380524 attribute is a NumberValue 4380528 datatype. The ProductionConfirmationNumberValue 4380524 attribute has a cardinality of zero or one 4380526 meaning that for each instance of the Operation 4380394 entity there may be one ProductionConfirmationNumberValue 4380524 attribute.

The EarliestScheduledExecutionStartDateTime 4380530 attribute is a DateTime 4380534 datatype. The EarliestScheduledExecutionStartDateTime 4380530 attribute has a cardinality of zero or one 4380532 meaning that for each instance of the Operation 4380394 entity there may be one EarliestScheduledExecutionStartDateTime 4380530 attribute.

The EarliestScheduledProcessingStartDateTime 4380536 attribute is a DateTime 4380540 datatype. The EarliestScheduledProcessingStartDateTime 4380536 attribute has a cardinality of zero or one 4380538 meaning that for each instance of the Operation 4380394 entity there may be one EarliestScheduledProcessingStartDateTime 4380536 attribute.

The EarliestScheduledTeardownStartDateTime 4380542 attribute is a DateTime 4380546 datatype. The EarliestScheduledTeardownStartDateTime 4380542 attribute has a cardinality of zero or one 4380544 meaning that for each instance of the Operation 4380394 entity there may be one EarliestScheduledTeardownStartDateTime 4380542 attribute.

The EarliestScheduledExecutionEndDateTime 4380548 attribute is a DateTime 4380552 datatype. The EarliestScheduledExecutionEndDateTime 4380548 attribute has a cardinality of zero or one 4380550 meaning that for each instance of the Operation 4380394 entity there may be one EarliestScheduledExecutionEndDateTime 4380548 attribute.

The LatestScheduledExecutionDateTimePeriod 4380554 attribute is a DateTime 4380558 datatype. The LatestScheduledExecutionDateTimePeriod 4380554 attribute has a cardinality of zero or one 4380556 meaning that for each instance of the Operation 4380394 entity there may be one LatestScheduledExecutionDateTimePeriod 4380554 attribute.

The LatestScheduledProcessingStartDateTime 4380560 attribute is a DateTime 4380564 datatype. The LatestScheduledProcessingStartDateTime 4380560 attribute has a cardinality of zero or one 4380562 meaning that for each instance of the Operation 4380394 entity there may be one LatestScheduledProcessingStartDateTime 4380560 attribute.

The LatestScheduledTeardownStartDateTime 4380566 attribute is a DateTime 4380570 datatype. The LatestScheduledTeardownStartDateTime 4380566 attribute has a cardinality of zero or one 4380568 meaning that for each instance of the Operation 4380394 entity there may be one LatestScheduledTeardownStartDateTime 4380566 attribute.

The LatestScheduledExecutionEndDateTime 4380572 attribute is a DateTime 4380576 datatype. The LatestScheduledExecutionEndDateTime 4380572 attribute has a cardinality of zero or one 4380574 meaning that for each instance of the Operation 4380394 entity there may be one LatestScheduledExecutionEndDateTime 4380572 attribute.

The PlannedQuantity 4380578 attribute is a Quantity 4380582 datatype. The PlannedQuantity 4380578 attribute has a cardinality of zero or one 4380580 meaning that for each instance of the Operation 4380394 entity there may be one PlannedQuantity 4380578 attribute.

The ExpectedScrapQuantity 4380584 attribute is a Quantity 4380588 datatype. The ExpectedScrapQuantity 4380584 attribute has a cardinality of zero or one 4380586 meaning that for each instance of the Operation 4380394 entity there may be one ExpectedScrapQuantity 4380584 attribute.

The PredecessorSuccessorRelationship 4380590 entity has various subordinate entities, namely Predecessor 4380594 and Successor 4380616.

The Predecessor 4380594 entity includes various attributes, namely ProductionOrderID 4380598, SequenceID 4380604 and OperationID 4380610.

The ProductionOrderID 4380598 attribute is a ProductionOrderID 4380602 datatype. The ProductionOrderID 4380598 attribute has a cardinality of one 4380600 meaning that for each instance of the Predecessor 4380594 entity there is one ProductionOrderID 4380598 attribute.

The SequenceID 4380604 attribute is a ProductionOrderSequenceID 4380608 datatype. The SequenceID 4380604 attribute has a cardinality of one 4380606 meaning that for each instance of the Predecessor 4380594 entity there is one SequenceID 4380604 attribute.

The OperationID 4380610 attribute is an OperationID 4380614 datatype. The OperationID 4380610 attribute has a cardinality of one 4380612 meaning that for each instance of the Predecessor 4380594 entity there is one OperationID 4380610 attribute.

The Successor 4380616 entity includes various attributes, namely ProductionOrderID 4380620, SequenceID 4380626 and OperationID 4380632.

The ProductionOrderID 4380620 attribute is a ProductionOrderID 4380624 datatype. The ProductionOrderID 4380620 attribute has a cardinality of one 4380622 meaning that for each instance of the Successor 4380616 entity there is one ProductionOrderID 4380620 attribute.

The SequenceID 4380626 attribute is a ProductionOrderSequenceID 4380630 datatype. The SequenceID 4380626 attribute has a cardinality of one 4380628 meaning that for each instance of the Successor 4380616 entity there is one SequenceID 4380626 attribute.

The OperationID 4380632 attribute is an OperationID 4380636 datatype. The OperationID 4380632 attribute has a cardinality of one 4380634 meaning that for each instance of the Successor 4380616 entity there is one OperationID 4380632 attribute.

The MaterialInput 4380638 entity includes various attributes, namely MaterialID 4380642, PlantID 4380648, InventoryManagedLocationInternalID 4380654, BatchID 4380660, ReservationID 4380666, ReservationItemID 4380672, PurchaseRequestID 4380678, PurchaseRequestItemID 4380684, SequenceID 4380690, OperationID 4380696, LogisticsAreaID 4380702, LogisticsAreaTypeCode 4380708, LogisticsAreaTypeName 4380714, LogisticsReservationItemRecordTypeCode 4380720, LogisticsReservationItemRecordTypeName 4380726, GoodsMovementTypeCode 4380732, GoodsMovementTypeName 4380738, LogisticsItemTypeCode 4380744, LogisticsItemTypeName 4380750, InventorySpecialStockTypeCode 4380756, InventorySpecialStockTypeName 4380762, InventorySpecialStockValuationTypeCode 4380768, InventorySpecialStockValuationTypeName 4380774, MaterialDescription 4380780, BackflushIndicator 4380786, DeletedIndicator 4380792, RequirementDate 4380798, RequirementQuantity 4380804, EntryQuantity 4380810, IssuedQuantity 4380816, AvailableQuantity 4380822 and ShortageQuantity 4380828.

The MaterialID 4380642 attribute is a ProductID 4380646 datatype. The MaterialID 4380642 attribute has a cardinality of one 4380644 meaning that for each instance of the MaterialInput 4380638 entity there is one MaterialID 4380642 attribute.

The PlantID 4380648 attribute is a PlantID 4380652 datatype. The PlantID 4380648 attribute has a cardinality of one 4380650 meaning that for each instance of the MaterialInput 4380638 entity there is one PlantID 4380648 attribute.

The InventoryManagedLocationInternalID 4380654 attribute is a LocationInternalID 4380658 datatype. The InventoryManagedLocationInternalID 4380654 attribute has a cardinality of one 4380656 meaning that for each instance of the MaterialInput 4380638 entity there is one InventoryManagedLocationInternalID 4380654 attribute.

The BatchID 4380660 attribute is a BatchID 4380664 datatype. The BatchID 4380660 attribute has a cardinality of zero or one 4380662 meaning that for each instance of the MaterialInput 4380638 entity there may be one BatchID 4380660 attribute.

The ReservationID 4380666 attribute is a ReservationID 4380670 datatype. The ReservationID 4380666 attribute has a cardinality of one 4380668 meaning that for each instance of the MaterialInput 4380638 entity there is one ReservationID 4380666 attribute.

The ReservationItemID 4380672 attribute is a ReservationItemID 4380676 datatype. The ReservationItemID 4380672 attribute has a cardinality of one 4380674 meaning that for each instance of the MaterialInput 4380638 entity there is one ReservationItemID 4380672 attribute.

The PurchaseRequestID 4380678 attribute is a PurchaseRequestID 4380682 datatype. The PurchaseRequestID 4380678 attribute has a cardinality of zero or one 4380680 meaning that for each instance of the MaterialInput 4380638 entity there may be one PurchaseRequestID 4380678 attribute.

The PurchaseRequestItemID 4380684 attribute is a PurchaseRequestItemID 4380688 datatype. The PurchaseRequestItemID 4380684 attribute has a cardinality of zero or one 4380686 meaning that for each instance of the MaterialInput 4380638 entity there may be one PurchaseRequestItemID 4380684 attribute.

The SequenceID 4380690 attribute is a ProductionOrderSequenceID 4380694 datatype. The SequenceID 4380690 attribute has a cardinality of one 4380692 meaning that for each instance of the MaterialInput 4380638 entity there is one SequenceID 4380690 attribute.

The OperationID 4380696 attribute is an OperationID 4380700 datatype. The OperationID 4380696 attribute has a cardinality of one 4380698 meaning that for each instance of the MaterialInput 4380638 entity there is one OperationID 4380696 attribute.

The LogisticsAreaID 4380702 attribute is a LogisticsAreaID 4380706 datatype. The LogisticsAreaID 4380702 attribute has a cardinality of zero or one 4380704 meaning that for each instance of the MaterialInput 4380638 entity there may be one LogisticsAreaID 4380702 attribute.

The LogisticsAreaTypeCode 4380708 attribute is a LogisticsAreaTypeCode 4380712 datatype. The LogisticsAreaTypeCode 4380708 attribute has a cardinality of zero or one 4380710 meaning that for each instance of the MaterialInput 4380638 entity there may be one LogisticsAreaTypeCode 4380708 attribute.

The LogisticsAreaTypeName 4380714 attribute is a LogisticsAreaTypeName 4380718 datatype. The LogisticsAreaTypeName 4380714 attribute has a cardinality of zero or one 4380716 meaning that for each instance of the MaterialInput 4380638 entity there may be one LogisticsAreaTypeName 4380714 attribute.

The LogisticsReservationItemRecordTypeCode 4380720 attribute is a LogisticsReservationItemRecordTypeCode 4380724 datatype. The LogisticsReservationItemRecordTypeCode 4380720 attribute has a cardinality of zero or one 4380722 meaning that for each instance of the MaterialInput 4380638 entity there may be one LogisticsReservationItemRecordTypeCode 4380720 attribute.

The LogisticsReservationItemRecordTypeName 4380726 attribute is a LogisticsReservationItemRecordTypeName 4380730 datatype. The LogisticsReservationItemRecordTypeName 4380726 attribute has a cardinality of zero or one 4380728 meaning that for each instance of the MaterialInput 4380638 entity there may be one LogisticsReservationItemRecordTypeName 4380726 attribute.

The GoodsMovementTypeCode 4380732 attribute is a GoodsMovementTypeCode 4380736 datatype. The GoodsMovementTypeCode 4380732 attribute has a cardinality of one 4380734 meaning that for each instance of the MaterialInput 4380638 entity there is one GoodsMovementTypeCode 4380732 attribute.

The GoodsMovementTypeName 4380738 attribute is a GoodsMovementTypeName 4380742 datatype. The GoodsMovementTypeName 4380738 attribute has a cardinality of one 4380740 meaning that for each instance of the MaterialInput 4380638 entity there is one GoodsMovementTypeName 4380738 attribute.

The LogisticsItemTypeCode 4380744 attribute is a LogisticsItemTypeCode 4380748 datatype. The LogisticsItemTypeCode 4380744 attribute has a cardinality of one 4380746 meaning that for each instance of the MaterialInput 4380638 entity there is one LogisticsItemTypeCode 4380744 attribute.

The LogisticsItemTypeName 4380750 attribute is a LogisticsItemTypeName 4380754 datatype. The LogisticsItemTypeName 4380750 attribute has a cardinality of one 4380752 meaning that for each instance of the MaterialInput 4380638 entity there is one LogisticsItemTypeName 4380750 attribute.

The InventorySpecialStockTypeCode 4380756 attribute is an InventorySpecialStockTypeCode 4380760 datatype. The InventorySpecialStockTypeCode 4380756 attribute has a cardinality of zero or one 4380758 meaning that for each instance of the MaterialInput 4380638 entity there may be one InventorySpecialStockTypeCode 4380756 attribute.

The InventorySpecialStockTypeName 4380762 attribute is an InventorySpecialStockTypeName 4380766 datatype. The InventorySpecialStockTypeName 4380762 attribute has a cardinality of zero or one 4380764 meaning that for each instance of the MaterialInput 4380638 entity there may be one InventorySpecialStockTypeName 4380762 attribute.

The InventorySpecialStockValuationTypeCode 4380768 attribute is an InventorySpecialStockValuationTypeCode 4380772 datatype. The InventorySpecialStockValuationTypeCode 4380768 attribute has a cardinality of zero or one 4380770 meaning that for each instance of the MaterialInput 4380638 entity there may be one InventorySpecialStockValuationTypeCode 4380768 attribute.

The InventorySpecialStockValuationTypeName 4380774 attribute is an InventorySpecialStockValuationTypeName 4380778 datatype. The InventorySpecialStockValuationTypeName 4380774 attribute has a cardinality of zero or one 4380776 meaning that for each instance of the MaterialInput 4380638 entity there may be one InventorySpecialStockValuationTypeName 4380774 attribute.

The MaterialDescription 4380780 attribute is a ProductDescription 4380784 datatype. The MaterialDescription 4380780 attribute has a cardinality of zero or one 4380782 meaning that for each instance of the MaterialInput 4380638 entity there may be one MaterialDescription 4380780 attribute.

The BackflushIndicator 4380786 attribute is an Indicator 4380790 datatype. The BackflushIndicator 4380786 attribute has a cardinality of zero or one 4380788 meaning that for each instance of the MaterialInput 4380638 entity there may be one BackflushIndicator 4380786 attribute.

The DeletedIndicator 4380792 attribute is an Indicator 4380796 datatype. The DeletedIndicator 4380792 attribute has a cardinality of zero or one 4380794 meaning that for each instance of the MaterialInput 4380638 entity there may be one DeletedIndicator 4380792 attribute.

The RequirementDate 4380798 attribute is a Date 4380802 datatype. The RequirementDate 4380798 attribute has a cardinality of one 4380800 meaning that for each instance of the MaterialInput 4380638 entity there is one RequirementDate 4380798 attribute.

The RequirementQuantity 4380804 attribute is a Quantity 4380808 datatype. The RequirementQuantity 4380804 attribute has a cardinality of zero or one 4380806 meaning that for each instance of the MaterialInput 4380638 entity there may be one RequirementQuantity 4380804 attribute.

The EntryQuantity 4380810 attribute is a Quantity 4380814 datatype. The EntryQuantity 4380810 attribute has a cardinality of zero or one 4380812 meaning that for each instance of the MaterialInput 4380638 entity there may be one EntryQuantity 4380810 attribute.

The IssuedQuantity 4380816 attribute is a Quantity 4380820 datatype. The IssuedQuantity 4380816 attribute has a cardinality of zero or one 4380818 meaning that for each instance of the MaterialInput 4380638 entity there may be one IssuedQuantity 4380816 attribute.

The AvailableQuantity 4380822 attribute is a Quantity 4380826 datatype. The AvailableQuantity 4380822 attribute has a cardinality of zero or one 4380824 meaning that for each instance of the MaterialInput 4380638 entity there may be one AvailableQuantity 4380822 attribute.

The ShortageQuantity 4380828 attribute is a Quantity 4380832 datatype. The ShortageQuantity 4380828 attribute has a cardinality of zero or one 4380830 meaning that for each instance of the MaterialInput 4380638 entity there may be one ShortageQuantity 4380828 attribute.

The MaterialOutput 4380834 entity includes various attributes, namely MaterialID 4380838, PlantID 4380844, InventoryManagedLocationInternalID 4380850, BatchID 4380856, ReservationID 4380862, ReservationItemID 4380868, SequenceID 4380874, OperationID 4380880, GoodsMovementTypeCode 4380886, GoodsMovementTypeName 4380892, LogisticsItemTypeCode 4380898, LogisticsItemTypeName 4380904, InventorySpecialStockTypeCode 4380910, InventorySpecialStockTypeName 4380916, InventorySpecialStockValuationTypeCode 4380922, InventorySpecialStockValuationTypeName 4380928, MaterialDescription 4380934, BackflushIndicator 4380940, DeletedIndicator 4380946, RequirementDate 4380952, RequirementQuantity 4380958, EntryQuantity 4380964 and IssuedQuantity 4380970.

The MaterialID 4380838 attribute is a ProductID 4380842 datatype. The MaterialID 4380838 attribute has a cardinality of one 4380840 meaning that for each instance of the MaterialOutput 4380834 entity there is one MaterialID 4380838 attribute.

The PlantID 4380844 attribute is a PlantID 4380848 datatype. The PlantID 4380844 attribute has a cardinality of one 4380846 meaning that for each instance of the MaterialOutput 4380834 entity there is one PlantID 4380844 attribute.

The InventoryManagedLocationInternalID 4380850 attribute is a LocationInternalID 4380854 datatype. The InventoryManagedLocationInternalID 4380850 attribute has a cardinality of one 4380852 meaning that for each instance of the MaterialOutput 4380834 entity there is one InventoryManagedLocationInternalID 4380850 attribute.

The BatchID 4380856 attribute is a BatchID 4380860 datatype. The BatchID 4380856 attribute has a cardinality of zero or one 4380858 meaning that for each instance of the MaterialOutput 4380834 entity there may be one BatchID 4380856 attribute.

The ReservationID 4380862 attribute is a ReservationID 4380866 datatype. The ReservationID 4380862 attribute has a cardinality of one 4380864 meaning that for each instance of the MaterialOutput 4380834 entity there is one ReservationID 4380862 attribute.

The ReservationItemID 4380868 attribute is a ReservationItemID 4380872 datatype. The ReservationItemID 4380868 attribute has a cardinality of one 4380870 meaning that for each instance of the MaterialOutput 4380834 entity there is one ReservationItemID 4380868 attribute.

The SequenceID 4380874 attribute is a ProductionOrderSequenceID 4380878 datatype. The SequenceID 4380874 attribute has a cardinality of one 4380876 meaning that for each instance of the MaterialOutput 4380834 entity there is one SequenceID 4380874 attribute.

The OperationID 4380880 attribute is an OperationID 4380884 datatype. The OperationID 4380880 attribute has a cardinality of one 4380882 meaning that for each instance of the MaterialOutput 4380834 entity there is one OperationID 4380880 attribute.

The GoodsMovementTypeCode 4380886 attribute is a GoodsMovementTypeCode 4380890 datatype. The GoodsMovementTypeCode 4380886 attribute has a cardinality of one 4380888 meaning that for each instance of the MaterialOutput 4380834 entity there is one GoodsMovementTypeCode 4380886 attribute.

The GoodsMovementTypeName 4380892 attribute is a GoodsMovementTypeName 4380896 datatype. The GoodsMovementTypeName 4380892 attribute has a cardinality of one 4380894 meaning that for each instance of the MaterialOutput 4380834 entity there is one GoodsMovementTypeName 4380892 attribute.

The LogisticsItemTypeCode 4380898 attribute is a LogisticsItemTypeCode 4380902 datatype. The LogisticsItemTypeCode 4380898 attribute has a cardinality of one 4380900 meaning that for each instance of the MaterialOutput 4380834 entity there is one LogisticsItemTypeCode 4380898 attribute.

The LogisticsItemTypeName 4380904 attribute is a LogisticsItemTypeName 4380908 datatype. The LogisticsItemTypeName 4380904 attribute has a cardinality of one 4380906 meaning that for each instance of the MaterialOutput 4380834 entity there is one LogisticsItemTypeName 4380904 attribute.

The InventorySpecialStockTypeCode 4380910 attribute is an InventorySpecialStockTypeCode 4380914 datatype. The InventorySpecialStockTypeCode 4380910 attribute has a cardinality of zero or one 4380912 meaning that for each instance of the MaterialOutput 4380834 entity there may be one InventorySpecialStockTypeCode 4380910 attribute.

The InventorySpecialStockTypeName 4380916 attribute is an InventorySpecialStockTypeName 4380920 datatype. The InventorySpecialStockTypeName 4380916 attribute has a cardinality of zero or one 4380918 meaning that for each instance of the MaterialOutput 4380834 entity there may be one InventorySpecialStockTypeName 4380916 attribute.

The InventorySpecialStockValuationTypeCode 4380922 attribute is an InventorySpecialStockValuationTypeCode 4380926 datatype. The InventorySpecialStockValuationTypeCode 4380922 attribute has a cardinality of zero or one 4380924 meaning that for each instance of the MaterialOutput 4380834 entity there may be one InventorySpecialStockValuationTypeCode 4380922 attribute.

The InventorySpecialStockValuationTypeName 4380928 attribute is an InventorySpecialStockValuationTypeName 4380932 datatype. The InventorySpecialStockValuationTypeName 4380928 attribute has a cardinality of zero or one 4380930 meaning that for each instance of the MaterialOutput 4380834 entity there may be one InventorySpecialStockValuationTypeName 4380928 attribute.

The MaterialDescription 4380934 attribute is a ProductDescription 4380938 datatype. The MaterialDescription 4380934 attribute has a cardinality of zero or one 4380936 meaning that for each instance of the MaterialOutput 4380834 entity there may be one MaterialDescription 4380934 attribute.

The BackflushIndicator 4380940 attribute is an Indicator 4380944 datatype. The BackflushIndicator 4380940 attribute has a cardinality of zero or one 4380942 meaning that for each instance of the MaterialOutput 4380834 entity there may be one BackflushIndicator 4380940 attribute.

The DeletedIndicator 4380946 attribute is an Indicator 4380950 datatype. The DeletedIndicator 4380946 attribute has a cardinality of zero or one 4380948 meaning that for each instance of the MaterialOutput 4380834 entity there may be one DeletedIndicator 4380946 attribute.

The RequirementDate 4380952 attribute is a Date 4380956 datatype. The RequirementDate 4380952 attribute has a cardinality of one 4380954 meaning that for each instance of the MaterialOutput 4380834 entity there is one RequirementDate 4380952 attribute.

The RequirementQuantity 4380958 attribute is a Quantity 4380962 datatype. The RequirementQuantity 4380958 attribute has a cardinality of zero or one 4380960 meaning that for each instance of the MaterialOutput 4380834 entity there may be one RequirementQuantity 4380958 attribute.

The EntryQuantity 4380964 attribute is a Quantity 4380968 datatype. The EntryQuantity 4380964 attribute has a cardinality of zero or one 4380966 meaning that for each instance of the MaterialOutput 4380834 entity there may be one EntryQuantity 4380964 attribute.

The IssuedQuantity 4380970 attribute is a Quantity 4380974 datatype. The IssuedQuantity 4380970 attribute has a cardinality of zero or one 4380972 meaning that for each instance of the MaterialOutput 4380834 entity there may be one IssuedQuantity 4380970 attribute.

The EventTriggerPoint 4380976 entity has a cardinality of zero or n 4380978 meaning that for each instance of the Operation 4380394 entity there may be one or more EventTriggerPoint 4380976 entities. The EventTriggerPoint 4380976 entity includes various attributes, namely ProductionEventTriggerPointID 4380980, OperationID 4380986, DeletedIndicator 4380992, EventAllowedIndicator 4380998, ValidityStartDate 43801004 and SystemAdministrativeData 43801010.

The ProductionEventTriggerPointID 4380980 attribute is a ProductionEventTriggerPointID 4380984 datatype. The ProductionEventTriggerPointID 4380980 attribute has a cardinality of one 4380982 meaning that for each instance of the EventTriggerPoint 4380976 entity there is one ProductionEventTriggerPointID 4380980 attribute.

The OperationID 4380986 attribute is an OperationID 4380990 datatype. The OperationID 4380986 attribute has a cardinality of one 4380988 meaning that for each instance of the EventTriggerPoint 4380976 entity there is one OperationID 4380986 attribute.

The DeletedIndicator 4380992 attribute is an Indicator 4380996 datatype. The DeletedIndicator 4380992 attribute has a cardinality of zero or one 4380994 meaning that for each instance of the EventTriggerPoint 4380976 entity there may be one DeletedIndicator 4380992 attribute.

The EventAllowedIndicator 4380998 attribute is an Indicator 43801002 datatype. The EventAllowedIndicator 4380998 attribute has a cardinality of zero or one 43801000 meaning that for each instance of the EventTriggerPoint 4380976 entity there may be one EventAllowedIndicator 4380998 attribute.

The ValidityStartDate 43801004 attribute is a Date 43801008 datatype. The ValidityStartDate 43801004 attribute has a cardinality of one 43801006 meaning that for each instance of the EventTriggerPoint 4380976 entity there is one ValidityStartDate 43801004 attribute.

The SystemAdministrativeData 43801010 attribute is a DATE_SystemAdministrativeData 43801014 datatype. The SystemAdministrativeData 43801010 attribute has a cardinality of one 43801012 meaning that for each instance of the EventTriggerPoint 4380976 entity there is one SystemAdministrativeData 43801010 attribute.

The Log 43801016 package is a Log 43801022 datatype. The Log 43801016 package includes a Log 43801018 entity.

The Log 43801018 entity has a cardinality of one 43801020 meaning that for each instance of the ProductionOrderByIDResponseMessage 438002 entity there is one Log 43801018 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader, which is optional, is a collection of identification data of an instance of a business document message, or reference data to another instance of a business document message, or both. The subject of the identification data is the message instance that conveys them, whereas the reference data are related to a different message instance previously exchanged between the same interaction parties.

ProductionOrder Package

The ProductionOrder package contains the detailed information about the production order to be confirmed by this message.

ProductionOrder

ProductionOrder is an order to produce a certain amount of one or more materials in a certain time frame.

ID is the unique identifier of the returned production order. PlantID identifies the plant the production order is assigned to. SupplyPlanningAreaID identifies the supply planning area the production order is assigned to. MaterialRequirementsPlanningControllerID, which can be optional, identifies the MRP controller assigned to the production order. ProductionSchedulerID, which can be optional, identifies the production scheduler assigned to the production order. MaterialInternalID is the unique identifier of the main material produced by the production order. ReservationID is a unique identifier of the corresponding reservation of the production order. ProductionConfirmationGroupID, which can be optional, identifies a production confirmation group. A production confirmation group groups individual production confirmations related to the production order. LeadingProductionOrderID, which can be optional, is the unique identifier of a leading production order (=highest level production order) in case the returned production order is part of a collective order. A collective order is a hierarchical aggregation of production orders. SalesOrderID, which can be optional, is the unique identifier of the sales order the production order is assigned to. SalesOrderItemID, which can be optional, is the unique identifier of a sales order item in the context of a sales order ID the production order is assigned to. CreationUserAccountID is the unique identifier of the person or batch user who created the production order. ProjectWorkBreakdownStructureElementID, which can be optional, identifies a single structure element of the project the production order is assigned to. ImportanceCode, which can be optional, is a coded representation of the importance of a production order. TypeCode is a coded representation of the type of a production order which includes e.g. the settlement rule, the rule for selecting a bill of materials, the number range etc. TypeName is the name the production order type MaterialDescription, which can be optional, is the description of the material to be produced by the production order. DeletedIndicator, which can be optional, indicates that the production order has been marked as deleted, but is not archived yet. AggregationIndicator, which can be optional, indicates that the production order is part of a collective order. A collective order is a hierarchical aggregation of production orders. ProductionConfirmationNumberValue represents the number of production confirmations carried out for this production order. CreationDate is the date of creation of the production order. ExplorationDate, which can be optional, is the date of exploring the bill of operation and/or the bill of material assigned to this production order. ScheduledReleaseDate, which can be optional, is the scheduled date at which the production order should be released. ActualReleasedDate, which can be optional, is the date at which the production order has been released. PlannedStartDateTime is the planned time point at which of the production starts. PlannedEndDateTime is the planned time point at which of the production ends. ScheduledStartDateTime, which can be optional, is the scheduled time point at which of the production starts. ScheduledEndDateTime, which can be optional, is the scheduled time point at which of the production ends. ConfirmedStartDateTime, which can be optional, is the time point at which the beginning of production has been confirmed by production confirmation. ConfirmedEndDateTime, which can be optional, is the time point at which the end of production has been confirmed by production confirmation. PlannedQuantity, which can be optional, is the allover planned quantity (yield+scrap) of the main product to be produced by the production order. ExpectedScrapQuantity, which can be optional, is the expected quantity of the main product that will not meet the quality requirements. AvailableQuantity, which can be optional, is the quantity of the main material that will be available after the available-to-promise check for the input materials has been carried out.

If ProductionOrder has a ProductionOrderCategoryCode of value 2 (process order), ProjectWorkBreakdownStructureElementID is not available.

Item Package

Item

Item represents a material to be produced with the production order. A production order having more than one item means that one main product and one or more additional co-products are produced with this order.

ID is the unique identifier of a production order item in context of a production order ID. PlantID identifies the plant the production order item is assigned to. SupplyPlanningAreaID, which can be optional, identifies the supply planning area the production order item is assigned to. MaterialRequirementsSupplyPlanningAreaID, which can be optional, is the unique identifier of the MaterialRequirementsSupplyPlanningArea the production order item is assigned to. ProductionVersionID, which can be optional, is the unique identifier the production version the production order item is assigned to. MaterialInternalID is the unique identifier of a material to be produced during the execution of the production order. InventoryManagedLocationInternalID, which can be optional, is the unique identifier of the inventory managed location in the context of the specified plant ID the produced material will be stored in. BatchID, which can be optional, is the unique identifier of a batch in the context of a material ID. If the corresponding material has a batch requirement, BatchID is present. MaterialDescription, which can be optional, is the description of the material to be produced by the production order. DeletedIndicator, which can be optional, indicates that the production order item has been marked as deleted. DeliveryCompletedIndicator, which can be optional, indicates that no further goods receipt of the produced material is expected. PlannedDeliveryDate is the date at which the delivery of the produced material is planned. ConfirmedDeliveryDate, which can be optional, is the date at which the delivery of the produced material has been confirmed. PlannedQuantity is the allover planned quantity (yield+scrap) of the product represented by the production order item. ExpectedScrapQuantity, which can be optional, is the expected quantity of the item that will not DeliveredQuantity, which can be optional, is the quantity of the product that is already delivered.

Sequence Package

Sequence

A production order sequence groups one or more operations—that describe the operations necessary for the production process—in a chronological order. ID is the unique identifier of a production order sequence in context of a production order ID.

BranchingOperationID, which can be optional, identifies the production order operation before which a production order sequence of category 'parallel sequence' or 'alternate sequence' is to branch off. It is a unique identifier of an operation in context of a production order sequence ID.

ReturningOperationID, which can be optional, identifies the production order operation after which a production order sequence is of category 'parallel sequence' or 'alternate sequence' is to return to the standard sequence. It is a unique identifier of an operation in context of a production order sequence ID.

ProductionBillOfOperationsGroupID, which can be optional, is the unique identifier of the production bill of operations group assigned to the production order sequence. A production bill of operations group combines production bills of operations that describe similar production processes or that are used to produce similar materials.

ProductionBillOfOperationsID, which can be optional, is the unique identifier of the production bill of operations assigned to the production order sequence. ProductionBillOfOperationsTypeCode, which can be optional, is the coded representation of the production bill of operations type assigned to the production order sequence. The ProductionBillOfOperationsTypeCode is used to group production bills of operations by their use.

CategoryCode is the coded representation of the production order sequence category, i.e. whether it is a standard sequence or a parallel sequence or an alternative sequence. CategoryName is the name of the production order sequence category. Description, which can be optional, is used to comment the production order sequence. LotSizeMinimumQuantity, which can be optional, is the minimum quantity of the lot size assigned the production order sequence. LotSizeMaximumQuantity, which can be optional, is the maximum quantity of the lot size assigned the production order sequence.

Operation Package

The Operation Package Contains the Entity Operation.

Operation

An operation is a self-contained division of a production process. ID is the unique identifier of a production order operation in context of a production order sequence ID. SequenceID is the unique identifier of the production order sequence in context of a production order ID the operation is assigned to. ProductionConfirmationGroupID identifies a production confirmation group. A production confirmation group groups individual production confirmations related to the production order operation. PurchaseRequestID, which can be optional, is the identifier of the purchase request assigned to the production order operation in case of external processing. PurchaseRequestItemID, which can be optional, is the identifier of a purchase request item in context of the purchase request ID assigned to the production order operation.

PlantID identifies the plant the production order operation is assigned to. WorkCentreID, which can be optional, identifies the work centre in context to the plant ID assigned to the production order operation. FirstProductionResourceClassID, which can be optional, identifies the first of up to six production resource classes assigned to this operation. A resource class classifies resources of a particular nature e.g. production resources.

SecondProductionResourceClassID, which can be optional, identifies the second of up to six production resource classes assigned to this operation. A resource class classifies resources of a particular nature e.g. production resources.

ThirdProductionResourceClassID, which can be optional, identifies the third of up to six production resource classes assigned to this operation. A resource class classifies resources of a particular nature e.g. production resources.

FourthProductionResourceClassID, which can be optional, identifies the fourth of up to six production resource classes assigned to this operation. A resource class classifies resources of a particular nature e.g. production resources.

FifthProductionResourceClassID, which can be optional, identifies the fifth of up to six production resource classes assigned to this operation. A resource class classifies resources of a particular nature e.g. production resources.

SixthProductionResourceClassID, which can be optional, identifies the sixth of up to six production resource classes assigned to this operation. A resource class classifies resources of a particular nature e.g. production resources.

ProductionBillOfOperationsGroupID, which can be optional, is the unique identifier of the production bill of operations group assigned to the production order operation. A production bill of operations group combines production bills of operations that describe similar production processes or that are used to produce similar materials.

ProductionBillOfOperationsID, which can be optional, is the unique identifier of the production bill of operations assigned to the production order operation.

ProductionBillOfOperationsTypeCode, which can be optional, is the coded representation of the production bill of operations type assigned to the production order operation. The ProductionBillOfOperationsTypeCode is used to group production bills of operations by their use.

ControlProfileCode is the coded representation of the operation control profile assigned to this production order operation which combines the controlling elements of business transactions within an operation.

ControlProfileName is the name of the production order operation control profile assigned to this production order operation.

WorkCentreName is the name of the work centre assigned to this production order operation.

Description, which can be optional, is used to comment the production order operation. AdditionalDescription, which can be optional, is used as additional comment of the production order operation. ProductionConfirmationNumberValue represents the number of production confirmations carried out for this production order operation. EarliestScheduledExecutionStartDateTime, which can be optional, is the earliest time point at which execution of the production step is scheduled to start. Time event ‘Execution’ includes the time events ‘setup’, ‘processing’ and ‘teardown’.

EarliestScheduledProcessingStartDateTime, which can be optional, is the earliest time point at which processing of the production step is scheduled to start. EarliestScheduledTeardownStartDateTime, which can be optional, is the earliest time point at which teardown of the production step is scheduled to start. EarliestScheduledExecutionEndDateTime, which can be optional, is the earliest time point at which execution of the production step is scheduled to end. LatestScheduledExecutionStartDateTime, which can be optional, is the latest time point at which execution of the production step is scheduled to start. Time event ‘Execution’ includes the time events ‘setup’, ‘processing’ and ‘teardown’. LatestScheduledProcessingStartDateTime, which can be optional, is the latest time point at which processing of the production step is scheduled to start. LatestScheduledTeardownStartDateTime, which can be optional, is the latest time point at which teardown of the production step is scheduled to start. LatestScheduledExecutionEndDateTime, which can be optional, is the latest time point at which execution of the production step is scheduled to end.

PlannedQuantity is the allover planned quantity (yield+scrap) of the product or intermediate to be produced by this production order operation. ExpectedScrapQuantity, which can be optional, is the expected quantity of the product or intermediate produced by this operation that will not meet the quality requirements.

EarliestScheduledTeardownStartDateTime is not available in case of ProductionOrder has a ProductionOrderCategoryCode of value 2 (process order). LatestScheduledTeardownStartDateTime is not available in case of ProductionOrder has a ProductionOrderCategoryCode of value 2 (process order).

Component Package

Component package contains the entities ComponentMaterialInput and ComponentMaterialOutput.

ComponentMaterialInput

A ComponentMaterialInput is a component required for the production of the output material(s).

MaterialInternalID is the unique identifier of an input material required for the production of the output materials. PlantID is the unique identifier of the plant the required input material is stored in. InventoryManagedLocationInternalID, which can be optional, is the unique identifier of the inventory managed location in the context of the specified plant ID the required input material is stored in. BatchID, which can be optional, is the unique identifier of a batch in the context of a material ID. If the corresponding material has a batch requirement, BatchID is mandatory. ReservationID is a unique identifier of the corresponding reservation of the production order.

ReservationItemID identifies the reservation item the input material is assigned to. PurchaseRequestID, which can be optional, is the identifier of the purchase request assigned to the input material in case of external purchased materials. PurchaseRequestItemID, which can be optional, is the identifier of a purchase request item in context of the purchase request ID assigned to the input material.

SequenceID is the unique identifier of the production order sequence—in context of a production order ID—the input material is assigned to. OperationID is the unique identifier of a production order operation—in the context of a production order sequenceID—the input material is assigned to. LogisticsAreaID, or SupplyAreaID, which can be optional, is the unique identifier of the supply area the input material is assigned to.

LogisticsAreaTypeCode, which can be optional, specifies the type of the logistics area identifier. LogisticsAreaTypeName list the name of the type of a logistics area. LogisticsReservationItemRecordTypeCode, which can be optional, is a coded representation of the type of the logistics reservation item record the input material is assigned to. A LogisticsReservationItemRecordType is a type to specify the nature of the logistics reservation item record in case of material discontinuation i.e. whether it’s the discontinued or the follow-up material. LogisticsReservationItemRecordTypeName, which can be optional, is the name of the type of a LogisticsReservationItemRecord. LogisticsItemTypeCode is a coded representation of the type of the material input item, e.g. inhouse material, external purchased material, variable size material. LogisticsItemTypeName is the name of the type of a LogisticsItem.

GoodsMovementTypeCode is a coded representation of the type of the goods movement e.g. goods issue for production. GoodsMovementTypeName is the name of the goods movement type code. InventorySpecialStockTypeCode, which can be optional, is a coded representation of the special stock the goods issue is withdrawn from, e.g. pipeline stock, sales order stock, project stock. InventorySpecialStockTypeName, which can be optional, is the name of the inventory special stock type code assigned to the material input. InventorySpecialStockValuationTypeCode, which can be optional, is the coded representation of the type of the valuation of the inventory special stock the input material is stored in. InventorySpecialStockValuationTypeCode, which can be optional, is name of the InventorySpecialStockValuationType assigned to the input material. MaterialDescription, which can be optional, is the description of the input material. DeletedIndicator, which can be optional, indicates that the material input position has been marked as deleted. BackflushIndicator, which can be optional, indicates that the input material can be backflushed, which means that it can be issued automatically during production confirmation. RequirementDate is the date at which the input material is required for production. RequirementQuantity is the quantity of an input material required for the execution of the production process. EntryQuantity is the quantity of an output material which is proposed to be entered during goods movements. IssuedQuantity is the already issued (withdrawn) quantity of an input material. AvailableQuantity is the quantity of an input material promised to be available for production, determined by the available-to-promise check. ShortageQuantity is the quantity of an input material which is not available for production yet, determined by the available-to-promise check.

LogisticsAreaTypeCode is filled only in case of LogisticsAreaID is filled. If so, no other Code than '4' is possible.

OperationComponentMaterialOutput

An OperationComponentMaterialOutput is a material with negative required quantity. It is a less important output material and therefore not defined as order item. MaterialInternalID is the unique identifier of a material produced by execution of the production order operation. PlantID is the unique identifier of the plant the output material is stored in. InventoryManagedLocationInternalID, which can be optional, is the unique identifier of the inventory managed location in the context of the specified plant ID the output material is stored in. BatchID, which can be optional, is the unique identifier of a batch in the context of a material ID. ReservationID is a unique identifier of the corresponding reservation of the production order. ReservationItemID identifies the reservation item to which the output material is assigned. SequenceID is the unique identifier of the production order sequence—in context of a production order ID—to which the output material is assigned. OperationID is the unique identifier of a production order operation—in the context of a production order sequenceID—the output material is assigned to. GoodsMovementTypeCode is a coded representation of the type of the goods movement e.g. goods receipt by-product from production. GoodsMovementTypeName is the name of the goods movement type code. ItemCategoryCode is a coded representation of the category of the material output item, e.g. inhouse material, variable size material etc. LogisticsItemCategoryName is the name of the category of a LogisticsItem. InventorySpecialStockTypeCode, which can be optional, is a coded representation of the special stock the goods receipts are posted, e.g. pipeline stock, sales order stock, project stock. InventorySpecialStockTypeName, which can be optional, is the name of the inventory special stock type code assigned to the output material. InventorySpecialStockValuationTypeCode, which can be optional, is the coded representation of the type of the valuation of the inventory special stock the output material will be stored in. InventorySpecialStockValuationTypeCode, which can be optional, is name of the InventorySpecialStockValuationType assigned to the output material. MaterialDescription, which can be optional, is the description of the output material. DeletedIndicator, which can be optional, indicates that the material output position has been marked as deleted. BackflushIndicator, which can be optional, indicates that the output material can be backflushed, which means that it can be issued automatically during production confirmation. RequirementDate is the date at which the output material is required to be produced. RequirementQuantity is the required quantity of an output material. EntryQuantity is the quantity of an output material which is proposed to be entered during goods movements. IssuedQuantity is the already issued (received) quantity of an output material.

EventTriggerPoint Package

EventTriggerPoint package contains the entity EventTriggerPoint.

EventTriggerPoint

An EventTriggerPoint defines the conditions that can be fulfilled in order to trigger a predefined event e.g creation of a rework operation. ID is the unique identifier of an event trigger point assigned to a production order operation. OperationID is the unique identifier of a production order operation—in the context of a production order sequenceID—the trigger point is assigned to. DeletedIndicator, which can be optional, indicates that the trigger point position has been marked as deleted. EventAllowedIndicator indicates that an event, e.g. creation of a rework production order, is allowed to be triggered by the trigger point. ValidityStartDate is the date from which the trigger point becomes valid. SystemAdministriveData represents the administrative data, e.g. date of creation, date of last change of the trigger point. If ProductionOrder has a ProductionOrderCategoryCode of value 2 (process order), OperationEventTriggerPoint is not available.

Relationship Package

Relationship package contains the entity PredecessorSuccessorRelationship.

PredecessorSuccessorRelationship

A PredecessorSuccessorRelationship describes a network of operations. ProductionOrderID is the unique identifier of the returned production order. SequenceID is the unique identifier of the production order sequence in context of a production order ID. OperationID is the unique identifier of a production order operation in the context of a production order sequenceID. If the returned ProductionOrder has a ProductionOrderCategoryCode of value 2 (process order) also operations from other production orders (with different ProductionOrderIDs) are possible. If the returned ProductionOrder has a ProductionOrderCategoryCode of value 1 (production order) the ProductionOrderID in the PredecessorSuccessorNode can be equal to the returned.

Log Package

Log

A log is a sequence of messages that may result from the execution of an application task.

ProductionPlanningOrder ERP Interface

Within the material requirements planning a production planning order is a request to initiate the in-house production of a particular quantity of a material on a defined date. It reflects all planning aspects of an in-house production process for a material. However, it is not used to control the production of the material itself. For this purpose the production planning order can be converted into a production order. Material requirements planners as well as production schedulers need to be able to get an overview over the production planning orders that are planned for covering internal and external requirements. They also need to know which material requirements on component level and which capacity requirements are caused by these production planning orders and are necessary.

Message Choreography

The message choreography of FIG. 443 describes a possible logical sequence of messages that can be used to realize a production planning order business scenario.

A ProductionPlanningOrderSimpleByElementsQuery_sync message is a query to Supply and Demand Matching asking for production planning orders matching with the given elements. The structure of the message type ProductionPlanningOrderSimpleByElementsQuery_sync is specified by the message data type ProductionPlanningOrderSimpleByElementsQueryMessage.

A ProductionPlanningOrderSimpleByElementsResponse_sync is the response to ProductionPlanningOrderSimpleByElementsQuery_sync message. The structure of the message type ProductionPlanningOrderSimpleByElementsResponse_sync is specified by the message data type ProductionPlanningOrderSimpleByElementsResponseMessage.

A ProductionPlanningOrderByIDQuery_sync is a query to Supply and Demand Matching to retrieve details of a production planning order. The structure of the message type ProductionPlanningOrderByIDQuery_sync is specified by the message data type ProductionPlanningOrderByIDQueryMessage.

A ProductionPlanningOrderByIDResponse_sync is the response to ProductionPlanningOrderByIDQuery_sync message. The structure of the message type ProductionPlanningOrderByIDResponse_sync is specified by the message data type ProductionPlanningOrderByIDResponseMessage.

For example, a "Manufacturing Execution" system 443002 can query production planning orders by elements using the ProductionPlanningOrderSimpleByElementsQuery_sync message 443006 as shown, for example, in FIG. 446. A "Supply and Demand Matching" system 443004 can respond to the query using the ProductionPlanningOrderSimpleByElementsResponse_sync message 443008 as shown, for example, in FIG. 447. The "Manufacturing Execution" system 443002 can query production planning orders by ID using the ProductionPlanningOrderByIDQuery_sync message 443010 as shown, for example, in FIG. 444. The "Supply and Demand Matching" system 443004 can respond to the query using the ProductionPlanningOrderByIDResponse_sync message 443012 as shown, for example, in FIG. 445.

Message Data Type

The message data type ProductionPlanningOrderSimpleByElementsQueryMessage_sync contains the ProductionPlanningOrderSimpleByElementsQuery included in the business document and the business information that is relevant for sending a business document in a message.

FIGS. 450-1 through 450-6 show a ProductionPlanningOrderSimpleByElementsQueryMessage_sync 450000 package. The ProductionPlanningOrderSimpleByElementsQueryMessage_sync 450000 package is a ProductionPlanningOrderSimpleByElementsQueryMessage_sync 450006 datatype. The ProductionPlanningOrderSimpleByElementsQueryMessage_sync 450000 package includes a ProductionPlanningOrderSimpleByElementsQueryMessage_sync 450002 entity. The ProductionPlanningOrderSimpleByElementsQueryMessage_sync 450000 package includes various packages, namely MessageHeader 450008 and ProductionPlanningOrderSimpleSelectionByElements 450016.

The MessageHeader 450008 package is a BasicBusinessDocumentMessageHeader 450014 datatype. The MessageHeader 450008 package includes a MessageHeader 450010 entity.

The MessageHeader 450010 entity has a cardinality of zero or one 450012 meaning that for each instance of the ProductionPlanningOrderSimpleByElementsQueryMessage_sync 450002 entity there may be one MessageHeader 450010 entity.

The ProductionPlanningOrderSimpleSelectionByElements 450016 package includes a ProductionPlanningOrderSimpleSelectionByElements 450018 entity.

The ProductionPlanningOrderSimpleSelectionByElements 450018 entity has a cardinality of one 450020 meaning that for each instance of the ProductionPlanningOrderSimpleByElementsQueryMessage_sync 450002 entity there is one ProductionPlanningOrderSimpleSelectionByElements 450018 entity. The ProductionPlanningOrderSimpleSelectionByElements 450018 entity has various subordinate entities, namely SelectionByMaterialInternalID 450022, SelectionBySupplyPlanningAreaID 450050, SelectionByMaterialRequirementsPlanningControllerID 450078, SelectionByProductionVersionID 4500106 and SelectionByBasicEndDate 4500134.

The SelectionByMaterialInternalID 450022 entity has a cardinality of zero or n 450024 meaning that for each instance of the ProductionPlanningOrderSimpleSelectionByElements 450018 entity there may be one or more SelectionByMaterialInternalID 450022 entities. The SelectionByMaterialInternalID 450022 entity includes various attributes, namely InclusionExclusionCode 450026, IntervalBoundaryTypeCode 450032, LowerBoundaryMaterialInternalID 450038 and UpperBoundaryMaterialInternalID 450044.

The InclusionExclusionCode 450026 attribute is an InclusionExclusionCode 450030 datatype. The InclusionExclusionCode 450026 attribute has a cardinality of one 450028 meaning that for each instance of the SelectionByMaterialInternalID 450022 entity there is one InclusionExclusionCode 450026 attribute.

The IntervalBoundaryTypeCode 450032 attribute is an IntervalBoundaryTypeCode 450036 datatype. The IntervalBoundaryTypeCode 450032 attribute has a cardinality of one 450034 meaning that for each instance of the SelectionByMaterialInternalID 450022 entity there is one IntervalBoundaryTypeCode 450032 attribute.

The LowerBoundaryMaterialInternalID 450038 attribute is a ProductInternalID 450042 datatype. The LowerBoundaryMaterialInternalID 450038 attribute has a cardinality of one 450040 meaning that for each instance of the SelectionByMaterialInternalID 450022 entity there is one LowerBoundaryMaterialInternalID 450038 attribute.

The UpperBoundaryMaterialInternalID 450044 attribute is a ProductInternalID 450048 datatype. The UpperBoundaryMaterialInternalID 450044 attribute has a cardinality of zero or one 450046 meaning that for each instance of the SelectionByMaterialInternalID 450022 entity there may be one UpperBoundaryMaterialInternalID 450044 attribute.

The SelectionBySupplyPlanningAreaID 450050 entity has a cardinality of zero or n 450052 meaning that for each instance of the ProductionPlanningOrderSimpleSelectionByElements 450018 entity there may be one or more SelectionBySupplyPlanningAreaID 450050 entities. The SelectionBySupplyPlanningAreaID 450050 entity includes various attributes, namely InclusionExclusionCode

450054, IntervalBoundaryTypeCode 450060, LowerBoundarySupplyPlanningAreaID 450066 and UpperBoundarySupplyPlanningAreaID 450072.

The InclusionExclusionCode 450054 attribute is an InclusionExclusionCode 450058 datatype. The InclusionExclusionCode 450054 attribute has a cardinality of one 450056 meaning that for each instance of the SelectionBySupplyPlanningAreaID 450050 entity there is one InclusionExclusionCode 450054 attribute.

The IntervalBoundaryTypeCode 450060 attribute is an IntervalBoundaryTypeCode 450064 datatype. The IntervalBoundaryTypeCode 450060 attribute has a cardinality of one 450062 meaning that for each instance of the SelectionBySupplyPlanningAreaID 450050 entity there is one IntervalBoundaryTypeCode 450060 attribute.

The LowerBoundarySupplyPlanningAreaID 450066 attribute is a SupplyPlanningAreaID 450070 datatype. The LowerBoundarySupplyPlanningAreaID 450066 attribute has a cardinality of one 450068 meaning that for each instance of the SelectionBySupplyPlanningAreaID 450050 entity there is one LowerBoundarySupplyPlanningAreaID 450066 attribute.

The UpperBoundarySupplyPlanningAreaID 450072 attribute is a SupplyPlanningAreaID 450076 datatype. The UpperBoundarySupplyPlanningAreaID 450072 attribute has a cardinality of zero or one 450074 meaning that for each instance of the SelectionBySupplyPlanningAreaID 450050 entity there may be one UpperBoundarySupplyPlanningAreaID 450072 attribute.

The SelectionByMaterialRequirementsPlanningControllerID 450078 entity has a cardinality of zero or n 450080 meaning that for each instance of the ProductionPlanningOrderSimpleSelectionByElements 450018 entity there may be one or more SelectionByMaterialRequirementsPlanningControllerID 450078 entities. The SelectionByMaterialRequirementsPlanningControllerID 450078 entity includes various attributes, namely InclusionExclusionCode 450082, IntervalBoundaryTypeCode 450088, LowerBoundaryMaterialRequirementsPlanningControllerID 450094 and UpperBoundaryMaterialRequirementsPlanningControllerID 4500100.

The InclusionExclusionCode 450082 attribute is an InclusionExclusionCode 450086 datatype. The InclusionExclusionCode 450082 attribute has a cardinality of one 450084 meaning that for each instance of the SelectionByMaterialRequirementsPlanningControllerID 450078 entity there is one InclusionExclusionCode 450082 attribute.

The IntervalBoundaryTypeCode 450088 attribute is an IntervalBoundaryTypeCode 450092 datatype. The IntervalBoundaryTypeCode 450088 attribute has a cardinality of one 450090 meaning that for each instance of the SelectionByMaterialRequirementsPlanningControllerID 450078 entity there is one IntervalBoundaryTypeCode 450088 attribute.

The LowerBoundaryMaterialRequirementsPlanningControllerID 450094 attribute is a PartyInternalID 450098 datatype. The LowerBoundaryMaterialRequirementsPlanningControllerID 450094 attribute has a cardinality of one 450096 meaning that for each instance of the SelectionByMaterialRequirementsPlanningControllerID 450078 entity there is one LowerBoundaryMaterialRequirementsPlanningControllerID 450094 attribute.

The UpperBoundaryMaterialRequirementsPlanningControllerID 4500100 attribute is a PartyInternalID 4500104 datatype. The UpperBoundaryMaterialRequirementsPlanningControllerID 4500100 attribute has a cardinality of zero or one 4500102 meaning that for each instance of the SelectionByMaterialRequirementsPlanningControllerID 450078 entity there may be one UpperBoundaryMaterialRequirementsPlanningControllerID 4500100 attribute.

The SelectionByProductionVersionID 4500106 entity has a cardinality of zero or n 4500108 meaning that for each instance of the ProductionPlanningOrderSimpleSelectionByElements 450018 entity there may be one or more SelectionByProductionVersionID 4500106 entities. The SelectionByProductionVersionID 4500106 entity includes various attributes, namely InclusionExclusionCode 4500110, IntervalBoundaryTypeCode 4500116, LowerBoundaryProductionVersionID 4500122 and UpperBoundaryProductionVersionID 4500128.

The InclusionExclusionCode 4500110 attribute is an InclusionExclusionCode 4500114 datatype. The InclusionExclusionCode 4500110 attribute has a cardinality of one 4500112 meaning that for each instance of the SelectionByProductionVersionID 4500106 entity there is one InclusionExclusionCode 4500110 attribute.

The IntervalBoundaryTypeCode 4500116 attribute is an IntervalBoundaryTypeCode 4500120 datatype. The IntervalBoundaryTypeCode 4500116 attribute has a cardinality of one 4500118 meaning that for each instance of the SelectionByProductionVersionID 4500106 entity there is one IntervalBoundaryTypeCode 4500116 attribute.

The LowerBoundaryProductionVersionID 4500122 attribute is a ProductionVersionID 4500126 datatype. The LowerBoundaryProductionVersionID 4500122 attribute has a cardinality of one 4500124 meaning that for each instance of the SelectionByProductionVersionID 4500106 entity there is one LowerBoundaryProductionVersionID 4500122 attribute.

The UpperBoundaryProductionVersionID 4500128 attribute is a ProductionVersionID 4500132 datatype. The UpperBoundaryProductionVersionID 4500128 attribute has a cardinality of zero or one 4500130 meaning that for each instance of the SelectionByProductionVersionID 4500106 entity there may be one UpperBoundaryProductionVersionID 4500128 attribute.

The SelectionByBasicEndDate 4500134 entity has a cardinality of zero or n 4500136 meaning that for each instance of the ProductionPlanningOrderSimpleSelectionByElements 450018 entity there may be one or more SelectionByBasicEndDate 4500134 entities. The SelectionByBasicEndDate 4500134 entity includes various attributes, namely InclusionExclusionCode 4500138, IntervalBoundaryTypeCode 4500144, LowerBoundaryBasicEndDate 4500150 and UpperBoundaryBasicEndDate 4500156.

The InclusionExclusionCode 4500138 attribute is an InclusionExclusionCode 4500142 datatype. The InclusionExclusionCode 4500138 attribute has a cardinality of one 4500140 meaning that for each instance of the SelectionByBasicEndDate 4500134 entity there is one InclusionExclusionCode 4500138 attribute.

The IntervalBoundaryTypeCode 4500144 attribute is an IntervalBoundaryTypeCode 4500148 datatype. The IntervalBoundaryTypeCode 4500144 attribute has a cardinality of one 4500146 meaning that for each instance of the SelectionByBasicEndDate 4500134 entity there is one IntervalBoundaryTypeCode 4500144 attribute.

The LowerBoundaryBasicEndDate 4500150 attribute is a Date 4500154 datatype. The LowerBoundaryBasicEndDate 4500150 attribute has a cardinality of one 4500152 meaning that for each instance of the SelectionByBasicEndDate 4500134 entity there is one LowerBoundaryBasicEndDate 4500150 attribute.

The UpperBoundaryBasicEndDate 4500156 attribute is a Date 4500160 datatype. The UpperBoundaryBasicEndDate 4500156 attribute has a cardinality of zero or one 4500158 meaning that for each instance of the SelectionByBasicEndDate 4500134 entity there may be one UpperBoundaryBasicEndDate 4500156 attribute.

MessageHeader Package

A MessageHeader package groups the business information that is relevant for sending a business document in a message.

MessageHeader

A MessageHeader contains the information to identify a business document in a message from the perspective of the sending application. The element BasicBusinessDocumentMessageHeader can be optional. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

Selection Package

ProductionPlanningOrderSimpleSelectionByElements

ProductionPlanningOrderSimpleSelectionByElements contains the selection criteria for the query. The elements located directly at ProductionPlanningOrderSimpleSelectionByElements are the SelectionByMaterialInternalID, SelectionBySupplyPlanningAreaID, SelectionByMaterialRequirementsPlanningControllerID, SelectionByProductionVersionID, and SelectionByBasicEndDate.

SelectionByMaterialInternalID, which can be optional, is a range of MaterialInternal Identifiers. The SelectionByMaterialInternalID consists of InclusionExclusionCode, IntervalBoundaryTypeCode, LowerBoundaryMaterialInternalID, and UpperBoundaryMaterialInternalID. InclusionExclusionCode is a coded representation of the inclusion of a set into a result set or the exclusion of it. IntervalBoundaryTypeCode is a coded representation of an interval boundary type. LowerBoundaryMaterialInternalID, a unique identifier for a MaterialInternal, is the lower boundary of the MaterialInternalID identifier interval. UpperBoundaryMaterialInternalID, which can be optional, is a unique identifier for a MaterialInternal. UpperBoundaryMaterialInternal is the upper boundary of the MaterialInternalID identifier interval.

SelectionBySupplyPlanningAreaID, which can be optional, is a range of SupplyPlanningArea Identifiers. SelectionBySupplyPlanningAreaID consists of InclusionExclusionCode, IntervalBoundaryTypeCode, LowerBoundarySupplyPlanningAreaID, and UpperBoundarySupplyPlanningAreaID. InclusionExclusionCode is a coded representation of the inclusion of a set into a result set or the exclusion of it. IntervalBoundaryTypeCode is a coded representation of an interval boundary type. LowerBoundarySupplyPlanningAreaID is a unique identifier for a plant the production planning order is assigned to. The LowerBoundarySupplyPlanningArea is the lower boundary of the SupplyPlanningAreaID identifier interval. The UpperBoundarySupplyPlanningAreaID, which can be optional, is a unique identifier for a Plant the production order is assigned to. The UpperBoundarySupplyPlanningArea is the upper boundary of the SupplyPlanningAreaID identifier interval.

SelectionByMaterialRequirementsPlanningControllerID, which can be optional, is a range of MaterialRequirementsPlanningController Identifiers. SelectionByMaterialRequirementsPlanningControllerID consists of InclusionExclusionCode, IntervalBoundaryTypeCode, LowerBoundaryMaterialRequirementsPlanningControllerID, and UpperBoundaryMaterialRequirementsPlanningControllerID. InclusionExclusionCode is a coded representation of the inclusion of a set into a result set or the exclusion of it. IntervalBoundaryTypeCode is a coded representation of an interval boundary type. LowerBoundaryMaterialRequirementsPlanningControllerID is a unique identifier for a MaterialRequirementsPlanningController assigned to the production planning order. The LowerBoundaryMaterialRequirementsPlanningController is the lower boundary of the MaterialRequirementsPlanningControllerID identifier interval. UpperBoundaryMaterialRequirementsPlanningControllerID is a unique identifier for a MaterialRequirementsPlanningController. The UpperBoundaryMaterialRequirementsPlanningController is the upper boundary of the MaterialRequirementsPlanningControllerID identifier interval.

SelectionByProductionVersionID, which can be optional, is a range of ProductionVersion Identifiers. SelectionByProductionVersionID consists of InclusionExclusionCode, IntervalBoundaryTypeCode, LowerBoundaryProductionVersionID, and UpperBoundaryProductionVersionID. InclusionExclusionCode is a coded representation of the inclusion of a set into a result set or the exclusion of it. IntervalBoundaryTypeCode is a coded representation of an interval boundary type. LowerBoundaryProductionVersionID is a unique identifier for a ProductionVersion assigned to the production planning order. The LowerBoundaryProductionVersion is the lower boundary of the ProductionVersionID identifier interval. UpperBoundaryProductionVersionID, which can be optional, is a unique identifier for a ProductionVersion assigned to the production planning order. The UpperBoundaryProductionVersion is the upper boundary of the ProductionVersionID identifier interval.

SelectionByBasicEndDate, which can be optional, is a range of basic end dates, and consists of InclusionExclusionCode, IntervalBoundaryTypeCode, LowerBoundaryBasicEndDate, and UpperBoundaryBasicEndDate. InclusionExclusionCode is a coded representation of the inclusion of a set into a result set or the exclusion of it. IntervalBoundaryTypeCode is a coded representation of an interval boundary type. LowerBoundaryBasicEndDate is a basic end date of ProductionPlanningOrders. The LowerBoundaryBasicEndDate is the lower boundary of the BasicEndDate interval. UpperBoundaryBasicEndDate is a basic end date of ProductionPlanningOrders. The UpperBoundaryBasicEndDate, which can be optional, is the upper boundary of the BasicEndDate interval.

Message Data Type

The message data type ProductionPlanningOrderSimpleByElementsResponseMessage_sync contains the ProductionPlanningOrderSimpleByElementsResponse included in the business document and the business information that is relevant for sending a business document in a message.

FIG. 451 shows a ProductionPlanningOrderSimpleByElementsResponseMessage_sync 451000 package. The ProductionPlanningOrderSimpleByElementsResponseMessage_sync 451000 package is a ProductionPlanningOrderSimpleByElementsResponseMessage_sync 451006 datatype. The ProductionPlanningOrderSimpleByElementsResponseMessage_sync 451000 package includes a ProductionPlanningOrderSimpleByElementsResponseMessage_sync 451002 entity. The ProductionPlanningOrder- SimpleByElementsResponseMessage_sync 451000 package includes various packages, namely MessageHeader 451008, ProductionPlanningOrder 451016 and Log 451028.

The MessageHeader 451008 package is a BasicBusinessDocumentMessageHeader 451014 datatype. The MessageHeader 451008 package includes a MessageHeader 451010 entity.

The MessageHeader 451010 entity has a cardinality of zero or one 451012 meaning that for each instance of the ProductionPlanningOrderSimpleByElementsResponseMessage_sync 451002 entity there may be one MessageHeader 451010 entity.

The ProductionPlanningOrder 451016 package includes a ProductionPlanningOrder 451018 entity.

The ProductionPlanningOrder 451018 entity has a cardinality of zero or n 451020 meaning that for each instance of the ProductionPlanningOrderSimpleByElementsResponseMessage_sync 451002 entity there may be one or more ProductionPlanningOrder 451018 entities. The ProductionPlanningOrder 451018 entity includes an ID 451022 attribute.

The ID 451022 attribute is a ProductionPlanningOrderID 451026 datatype. The ID 451022 attribute has a cardinality of one 451024 meaning that for each instance of the ProductionPlanningOrder 451018 entity there is one ID 451022 attribute.

The Log 451028 package is a Log 451034 datatype. The Log 451028 package includes a Log 451030 entity.

The Log 451030 entity has a cardinality of one 451032 meaning that for each instance of the ProductionPlanningOrderSimpleByElementsResponseMessage_sync 451002 entity there is one Log 451030 entity.

MessageHeader Package

A MessageHeader package groups the business information that is relevant for sending a business document in a message.

MessageHeader

A MessageHeader contains the information to identify a business document in a message from the perspective of the sending application. The BasicBusinessDocumentMessageHeader, which is optional, is a collection of identification data of an instance of a business document message, or reference data to another instance of a business document message, or both. The subject of the identification data is the message instance that conveys them, whereas the reference data are related to a different message instance previously exchanged between the same interaction parties.

ProductionPlanningOrder Package

The ProductionPlanningOrder package contains the identifiers of the production planning order to be returned by this message.

ProductionPlanningOrder

A ProductionPlanningOrder is a request made to a planning area (SupplyPlanningArea) to initiate the production of a particular quantity of a material on a defined date. The production planning order contains planning, administrative, and descriptive attributes. The elements located directly at the ProductionPlanningOrder node include the ProductionPlanningOrderID. The ProductionPlanningOrderID is the unique identifier of a production planning order.

Log Package

Log

A log is a sequence of messages that may result from the execution of an application task.

Message Data Type

The message data type ProductionPlanningOrderByIDQueryMessage_sync contains the ProductionPlanningOrderByIDQuery included in the business document and the business information that is relevant for sending a business document in a message.

FIG. 448 shows a ProductionPlanningOrderByIDQueryMessage_sync 448000 package. The ProductionPlanningOrderByIDQueryMessage_sync 448000 package is a ProductionPlanningOrderByIDQueryMessage_sync 448006 datatype. The ProductionPlanningOrderByIDQueryMessage_sync 448000 package includes a ProductionPlanningOrderByIDQueryMessage_sync 448002 entity. The ProductionPlanningOrderByIDQueryMessage_sync 448000 package includes various packages, namely MessageHeader 448008 and ProductionPlanningOrderSelectionByID 448016.

The MessageHeader 448008 package is a BasicBusinessDocumentMessageHeader 448014 datatype. The MessageHeader 448008 package includes a MessageHeader 448010 entity.

The MessageHeader 448010 entity has a cardinality of zero or one 448012 meaning that for each instance of the ProductionPlanningOrderByIDQueryMessage_sync 448002 entity there may be one MessageHeader 448010 entity.

The ProductionPlanningOrderSelectionByID 448016 package includes a ProductionPlanningOrderSelectionByID 448018 entity.

The ProductionPlanningOrderSelectionByID 448018 entity has a cardinality of one 448020 meaning that for each instance of the ProductionPlanningOrderByIDQueryMessage_sync 448002 entity there is one ProductionPlanningOrderSelectionByID 448018 entity. The ProductionPlanningOrderSelectionByID 448018 entity includes an ID 448022 attribute.

The ID 448022 attribute is a ProductionPlanningOrderID 448026 datatype. The ID 448022 attribute has a cardinality of one 448024 meaning that for each instance of the ProductionPlanningOrderSelectionByID 448018 entity there is one ID 448022 attribute.

MessageHeader Package

A MessageHeader package groups the business information that is relevant for sending a business document in a message.

MessageHeader

A MessageHeader contains the information to identify a business document in a message from the perspective of the sending application. The MessageHeader optionally contains the element BasicBusinessDocumentMessageHeader. The BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

Selection Package

ProductionPlanningOrderSelectionByID

ProductionPlanningOrderSelectionByID contains the production planning order ID (key field) of the production planning order to be used as query to Supply and Demand Matching. ProductionPlanningOrderSelectionByID contains the selection criteria SelectionByID. SelectionByID contains the ProductionPlanningOrderID.

Message Data Type

The message data type ProductionPlanningOrderByIDResponseMessage_sync contains the ProductionPlanningOrderByIDResponse included in the business document and the business information that is relevant for sending a business document in a message.

FIGS. 449-1 through 449-21 show a ProductionPlanningOrderByIDResponseMessage_sync 449000 package. The ProductionPlanningOrderByIDResponseMessage_sync 449000 package is a ProductionPlanningOrderByIDResponseMessage_sync 449006 datatype. The ProductionPlanningOrderByIDResponseMessage_sync 449000 package includes a ProductionPlanningOrderByIDResponseMessage_sync 449002 entity. The ProductionPlanningOrderByIDResponseMessage_sync 449000 package includes various packages, namely MessageHeader 449008, ProductionPlanningOrder 449016 and Log 4490724.

The MessageHeader 449008 package is a BasicBusinessDocumentMessageHeader 449014 datatype. The MessageHeader 449008 package includes a MessageHeader 449010 entity.

The MessageHeader 449010 entity has a cardinality of zero or one 449012 meaning that for each instance of the ProductionPlanningOrderByIDResponseMessage_sync 449002 entity there may be one MessageHeader 449010 entity.

The ProductionPlanningOrder 449016 package includes a ProductionPlanningOrder 449018 entity. The ProductionPlanningOrder 449016 package includes various packages, namely InputMaterial 4490406, OutputMaterial 4490558 and CapacityRequirement 4490662.

The ProductionPlanningOrder 449018 entity has a cardinality of zero or one 449020 meaning that for each instance of the ProductionPlanningOrderByIDResponseMessage_sync 449002 entity there may be one ProductionPlanningOrder 449018 entity. The ProductionPlanningOrder 449018 entity includes various attributes, namely ID 449022, MaterialInternalID 449028, SupplyPlanningAreaID 449034, PlantID 449040, InventoryManagedLocationInternalID 449046, MaterialRequirementsSupplyPlanningAreaID 449052, MaterialRequirementsPlanningControllerID 449058, SalesOrderID 449064, SalesOrderItemID 449070, ProjectWorkBreakdownStructureElementID 449076, ReservationID 449082, ProductionMasterDataExplosionDateID 449088, ProductionBillOfMaterialVariantID 449094, SuperiorReservationID 4490100, SuperiorReservationItemID 4490106, ProductionVersionID 4490112, ProductionSchedulerID 4490118, RequirementsTotalRecordsReservationID 4490124, SubcontractingVendorID 4490130, CapacityRequirementID 4490136, ProductionBillOfOperationsGroupID 4490142, ProductionBillOfOperationsID 4490148, ProcurementTypeCode 4490154, ProcurementTypeName 4490160, AccountingCodingBlockTypeCode 4490166, AccountingCodingBlockTypeName 4490172, InventorySpecialStockTypeCode 4490178, InventorySpecialStockTypeName 4490184, ProductionBillOfMaterialVariantUsageCode 4490190, ProductionBillOfMaterialVariantUsageName 4490196, ProductAvailabilityConfirmationStatusCode 4490202, ProductAvailabilityConfirmationStatusName 4490208, AvailabilityCheckTypeCode 4490214, AvailabilityCheckTypeName 4490220, InventorySpecialStockValuationTypeCode 4490226, InventorySpecialStockValuationTypeName 4490232, ProductionBillOfOperationsTypeCode 4490238, ProductionBillOfOperationsTypeName 4490244, LogisticsSchedulingTypeCode 4490250, LogisticsSchedulingTypeName 4490256, LogisticsSchedulingResultCode 4490262, LogisticsSchedulingResultName 4490268, ConvertIndicator 4490274, FixedIndicator 4490280, BillOfMaterialExplosionFixedIndicator 4490286, CapacityDispatchedIndicator 4490292, AssemblyOrderProcessingUsedIndicator 4490298, CollectiveOrderLeadingIndicator 4490304, RequirementsSummarydIndicator 4490310, RepetitiveManufacturingUsedIndicator 4490316, KanbanReplenishmentElementRoleIndicator 4490322, BasicStartDate 4490328, BasicEndDate 4490334, PlannedOpeningDate 4490340, ProductionMasterDataExplosionDate 4490346, TotalAvailabilityDate 4490352, ScheduledStartDateTime 4490358, ScheduledEndDateTime 4490364, SequencePlanningStartDateTime 4490370, SequencePlanningEndDateTime 4490376, PlannedTotalQuantity 4490382, ExpectedScrapQuantity 4490388, DeliveredQuantity 4490394 and IssuedQuantity 4490400.

The ID 449022 attribute is a ProductionPlanningOrderID 449026 datatype. The ID 449022 attribute has a cardinality of one 449024 meaning that for each instance of the ProductionPlanningOrder 449018 entity there is one ID 449022 attribute.

The MaterialInternalID 449028 attribute is a ProductInternalID 449032 datatype. The MaterialInternalID 449028 attribute has a cardinality of one 449030 meaning that for each instance of the ProductionPlanningOrder 449018 entity there is one MaterialInternalID 449028 attribute.

The SupplyPlanningAreaID 449034 attribute is a SupplyPlanningAreaID 449038 datatype. The SupplyPlanningAreaID 449034 attribute has a cardinality of one 449036 meaning that for each instance of the ProductionPlanningOrder 449018 entity there is one SupplyPlanningAreaID 449034 attribute.

The PlantID 449040 attribute is a PlantID 449044 datatype. The PlantID 449040 attribute has a cardinality of zero or one 449042 meaning that for each instance of the ProductionPlanningOrder 449018 entity there may be one PlantID 449040 attribute.

The InventoryManagedLocationInternalID 449046 attribute is a LocationInternalID 449050 datatype. The InventoryManagedLocationInternalID 449046 attribute has a cardinality of zero or one 449048 meaning that for each instance of the ProductionPlanningOrder 449018 entity there may be one InventoryManagedLocationInternalID 449046 attribute.

The MaterialRequirementsSupplyPlanningAreaID 449052 attribute is a SupplyPlanningAreaID 449056 datatype. The MaterialRequirementsSupplyPlanningAreaID 449052 attribute has a cardinality of zero or one 449054 meaning that for each instance of the ProductionPlanningOrder 449018 entity there may be one MaterialRequirementsSupplyPlanningAreaID 449052 attribute.

The MaterialRequirementsPlanningControllerID 449058 attribute is a PartyInternalID 449062 datatype. The MaterialRequirementsPlanningControllerID 449058 attribute has a cardinality of zero or one 449060 meaning that for each instance of the ProductionPlanningOrder 449018 entity there may be one MaterialRequirementsPlanningControllerID 449058 attribute.

The SalesOrderID 449064 attribute is a SalesOrderID 449068 datatype. The SalesOrderID 449064 attribute has a cardinality of one 449066 meaning that for each instance of the ProductionPlanningOrder 449018 entity there is one SalesOrderID 449064 attribute.

The SalesOrderItemID 449070 attribute is a SalesOrderItemID 449074 datatype. The SalesOrderItemID 449070 attribute has a cardinality of one 449072 meaning that for each instance of the ProductionPlanningOrder 449018 entity there is one SalesOrderItemID 449070 attribute.

The ProjectWorkBreakdownStructureElementID 449076 attribute is a ProjectWorkBreakdownStructureElementID 449080 datatype. The ProjectWorkBreakdownStructureElementID 449076 attribute has a cardinality of one 449078 meaning that for each instance of the ProductionPlanningOrder 449018 entity there is one ProjectWorkBreakdownStructureElementID 449076 attribute.

The ReservationID 449082 attribute is a ReservationID 449086 datatype. The ReservationID 449082 attribute has a cardinality of one 449084 meaning that for each instance of the ProductionPlanningOrder 449018 entity there is one ReservationID 449082 attribute.

The ProductionMasterDataExplosionDateID 449088 attribute is a ProductionMasterDataExplosionDateID 449092 datatype. The ProductionMasterDataExplosionDateID 449088 attribute has a cardinality of zero or one 449090 meaning that for each instance of the ProductionPlanningOrder 449018 entity there may be one ProductionMasterDataExplosionDateID 449088 attribute.

The ProductionBillOfMaterialVariantID 449094 attribute is a ProductionBillOfMaterialVariantID 449098 datatype. The ProductionBillOfMaterialVariantID 449094 attribute has a cardinality of zero or one 449096 meaning that for each instance of the ProductionPlanningOrder 449018 entity there may be one ProductionBillOfMaterialVariantID 449094 attribute.

The SuperiorReservationID 4490100 attribute is a ReservationID 4490104 datatype. The SuperiorReservationID 4490100 attribute has a cardinality of zero or one 4490102 meaning that for each instance of the ProductionPlanningOrder 449018 entity there may be one SuperiorReservationID 4490100 attribute.

The SuperiorReservationItemID 4490106 attribute is a ReservationItemID 4490110 datatype. The SuperiorReservationItemID 4490106 attribute has a cardinality of zero or one 4490108 meaning that for each instance of the ProductionPlanningOrder 449018 entity there may be one SuperiorReservationItemID 4490106 attribute.

The ProductionVersionID 4490112 attribute is a ProductionVersionID 4490116 datatype. The ProductionVersionID 4490112 attribute has a cardinality of zero or one 4490114 meaning that for each instance of the ProductionPlanningOrder 449018 entity there may be one ProductionVersionID 4490112 attribute.

The ProductionSchedulerID 4490118 attribute is a PartyInternalID 4490122 datatype. The ProductionSchedulerID 4490118 attribute has a cardinality of zero or one 4490120 meaning that for each instance of the ProductionPlanningOrder 449018 entity there may be one ProductionSchedulerID 4490118 attribute.

The RequirementsTotalRecordsReservationID 4490124 attribute is a ReservationID 4490128 datatype. The RequirementsTotalRecordsReservationID 4490124 attribute has a cardinality of zero or one 4490126 meaning that for each instance of the ProductionPlanningOrder 449018 entity there may be one RequirementsTotalRecordsReservationID 4490124 attribute.

The SubcontractingVendorID 4490130 attribute is a PartyInternalID 4490134 datatype. The SubcontractingVendorID 4490130 attribute has a cardinality of zero or one 4490132 meaning that for each instance of the ProductionPlanningOrder 449018 entity there may be one SubcontractingVendorID 4490130 attribute.

The CapacityRequirementID 4490136 attribute is a CapacityRequirementID 4490140 datatype. The CapacityRequirementID 4490136 attribute has a cardinality of zero or one 4490138 meaning that for each instance of the ProductionPlanningOrder 449018 entity there may be one CapacityRequirementID 4490136 attribute.

The ProductionBillOfOperationsGroupID 4490142 attribute is a ProductionBillOfOperationsGroupID 4490146 datatype. The ProductionBillOfOperationsGroupID 4490142 attribute has a cardinality of zero or one 4490144 meaning that for each instance of the ProductionPlanningOrder 449018 entity there may be one ProductionBillOfOperationsGroupID 4490142 attribute.

The ProductionBillOfOperationsID 4490148 attribute is a ProductionBillOfOperationsID 4490152 datatype. The ProductionBillOfOperationsID 4490148 attribute has a cardinality of zero or one 4490150 meaning that for each instance of the ProductionPlanningOrder 449018 entity there may be one ProductionBillOfOperationsID 4490148 attribute.

The ProcurementTypeCode 4490154 attribute is a ProcurementTypeCode 4490158 datatype. The ProcurementTypeCode 4490154 attribute has a cardinality of one 4490156 meaning that for each instance of the ProductionPlanningOrder 449018 entity there is one ProcurementTypeCode 4490154 attribute.

The ProcurementTypeName 4490160 attribute is a ProcurementTypeName 4490164 datatype. The ProcurementTypeName 4490160 attribute has a cardinality of one 4490162 meaning that for each instance of the ProductionPlanningOrder 449018 entity there is one ProcurementTypeName 4490160 attribute.

The AccountingCodingBlockTypeCode 4490166 attribute is an AccountingCodingBlockTypeCode 4490170 datatype. The AccountingCodingBlockTypeCode 4490166 attribute has a cardinality of one 4490168 meaning that for each instance of the ProductionPlanningOrder 449018 entity there is one AccountingCodingBlockTypeCode 4490166 attribute.

The AccountingCodingBlockTypeName 4490172 attribute is a MEDIUM_name 4490176 datatype. The AccountingCodingBlockTypeName 4490172 attribute has a cardinality of one 4490174 meaning that for each instance of the ProductionPlanningOrder 449018 entity there is one AccountingCodingBlockTypeName 4490172 attribute.

The InventorySpecialStockTypeCode 4490178 attribute is an InventorySpecialStockTypeCode 4490182 datatype. The InventorySpecialStockTypeCode 4490178 attribute has a cardinality of zero or one 4490180 meaning that for each instance of the ProductionPlanningOrder 449018 entity there may be one InventorySpecialStockTypeCode 4490178 attribute.

The InventorySpecialStockTypeName 4490184 attribute is an InventorySpecialStockTypeName 4490188 datatype. The InventorySpecialStockTypeName 4490184 attribute has a cardinality of zero or one 4490186 meaning that for each instance of the ProductionPlanningOrder 449018 entity there may be one InventorySpecialStockTypeName 4490184 attribute.

The ProductionBillOfMaterialVariantUsageCode 4490190 attribute is a ProductionBillOfMaterialVariantUsageCode 4490194 datatype. The ProductionBillOfMaterialVariantUsageCode 4490190 attribute has a cardinality of zero or one 4490192 meaning that for each instance of the ProductionPlanningOrder 449018 entity there may be one ProductionBillOfMaterialVariantUsageCode 4490190 attribute.

The ProductionBillOfMaterialVariantUsageName 4490196 attribute is a ProductionBillOfMaterialVariantUsageName 4490200 datatype. The ProductionBillOfMaterialVariantUsageName 4490196 attribute has a cardinality of zero or one 4490198 meaning that for each instance of the ProductionPlanningOrder 449018 entity there may be one ProductionBillOfMaterialVariantUsageName 4490196 attribute.

The ProductAvailabilityConfirmationStatusCode 4490202 attribute is a ProductAvailabilityConfirmationStatusCode 4490206 datatype. The ProductAvailability- ConfirmationStatusCode 4490202 attribute has a cardinality of zero or one 4490204 meaning that for each instance of the ProductionPlanningOrder 449018 entity there may be one ProductAvailabilityConfirmationStatusCode 4490202 attribute.

The ProductAvailabilityConfirmationStatusName 4490208 attribute is a MEDIUM_name 4490212 datatype. The ProductAvailabilityConfirmationStatusName 4490208 attribute has a cardinality of zero or one 4490210 meaning that for each instance of the ProductionPlanningOrder 449018 entity there may be one ProductAvailabilityConfirmationStatusName 4490208 attribute.

The AvailabilityCheckTypeCode 4490214 attribute is a ProductionPlanningOrderAvailabilityCheckTypeCode 4490218 datatype. The AvailabilityCheckTypeCode 4490214 attribute has a cardinality of zero or one 4490216 meaning that for each instance of the ProductionPlanningOrder 449018 entity there may be one AvailabilityCheckTypeCode 4490214 attribute.

The AvailabilityCheckTypeName 4490220 attribute is a ProductionPlanningOrderAvailabilityCheckTypeName 4490224 datatype. The AvailabilityCheckTypeName 4490220 attribute has a cardinality of zero or one 4490222 meaning that for each instance of the ProductionPlanningOrder 449018 entity there may be one AvailabilityCheckTypeName 4490220 attribute.

The InventorySpecialStockValuationTypeCode 4490226 attribute is an InventorySpecialStockValuationTypeCode 4490230 datatype. The InventorySpecialStockValuationTypeCode 4490226 attribute has a cardinality of zero or one 4490228 meaning that for each instance of the ProductionPlanningOrder 449018 entity there may be one InventorySpecialStockValuationTypeCode 4490226 attribute.

The InventorySpecialStockValuationTypeName 4490232 attribute is an InventorySpecialStockValuationTypeName 4490236 datatype. The InventorySpecialStockValuationTypeName 4490232 attribute has a cardinality of zero or one 4490234 meaning that for each instance of the ProductionPlanningOrder 449018 entity there may be one InventorySpecialStockValuationTypeName 4490232 attribute.

The ProductionBillOfOperationsTypeCode 4490238 attribute is a ProductionBillOfOperationsTypeCode 4490242 datatype. The ProductionBillOfOperationsTypeCode 4490238 attribute has a cardinality of zero or one 4490240 meaning that for each instance of the ProductionPlanningOrder 449018 entity there may be one ProductionBillOfOperationsTypeCode 4490238 attribute.

The ProductionBillOfOperationsTypeName 4490244 attribute is a ProductionBillOfOperationsTypeName 4490248 datatype. The ProductionBillOfOperationsTypeName 4490244 attribute has a cardinality of zero or one 4490246 meaning that for each instance of the ProductionPlanningOrder 449018 entity there may be one ProductionBillOfOperationsTypeName 4490244 attribute.

The LogisticsSchedulingTypeCode 4490250 attribute is a LogisticsSchedulingTypeCode 4490254 datatype. The LogisticsSchedulingTypeCode 4490250 attribute has a cardinality of zero or one 4490252 meaning that for each instance of the ProductionPlanningOrder 449018 entity there may be one LogisticsSchedulingTypeCode 4490250 attribute.

The LogisticsSchedulingTypeName 4490256 attribute is a LogisticsSchedulingTypeName 4490260 datatype. The LogisticsSchedulingTypeName 4490256 attribute has a cardinality of zero or one 4490258 meaning that for each instance of the ProductionPlanningOrder 449018 entity there may be one LogisticsSchedulingTypeName 4490256 attribute.

The LogisticsSchedulingResultCode 4490262 attribute is a LogisticsSchedulingResultCode 4490266 datatype. The LogisticsSchedulingResultCode 4490262 attribute has a cardinality of zero or one 4490264 meaning that for each instance of the ProductionPlanningOrder 449018 entity there may be one LogisticsSchedulingResultCode 4490262 attribute.

The LogisticsSchedulingResultName 4490268 attribute is a LogisticsSchedulingResultName 4490272 datatype. The LogisticsSchedulingResultName 4490268 attribute has a cardinality of zero or one 4490270 meaning that for each instance of the ProductionPlanningOrder 449018 entity there may be one LogisticsSchedulingResultName 4490268 attribute.

The ConvertIndicator 4490274 attribute is an Indicator 4490278 datatype. The ConvertIndicator 4490274 attribute has a cardinality of one 4490276 meaning that for each instance of the ProductionPlanningOrder 449018 entity there is one ConvertIndicator 4490274 attribute.

The FixedIndicator 4490280 attribute is an Indicator 4490284 datatype. The FixedIndicator 4490280 attribute has a cardinality of one 4490282 meaning that for each instance of the ProductionPlanningOrder 449018 entity there is one FixedIndicator 4490280 attribute.

The BillOfMaterialExplosionFixedIndicator 4490286 attribute is an Indicator 4490290 datatype. The BillOfMaterialExplosionFixedIndicator 4490286 attribute has a cardinality of one 4490288 meaning that for each instance of the ProductionPlanningOrder 449018 entity there is one BillOfMaterialExplosionFixedIndicator 4490286 attribute.

The CapacityDispatchedIndicator 4490292 attribute is an Indicator 4490296 datatype. The CapacityDispatchedIndicator 4490292 attribute has a cardinality of zero or one 4490294 meaning that for each instance of the ProductionPlanningOrder 449018 entity there may be one CapacityDispatchedIndicator 4490292 attribute.

The AssemblyOrderProcessingUsedIndicator 4490298 attribute is an Indicator 4490302 datatype. The AssemblyOrderProcessingUsedIndicator 4490298 attribute has a cardinality of zero or one 4490300 meaning that for each instance of the ProductionPlanningOrder 449018 entity there may be one AssemblyOrderProcessingUsedIndicator 4490298 attribute.

The CollectiveOrderLeadingIndicator 4490304 attribute is an Indicator 4490308 datatype. The CollectiveOrderLeadingIndicator 4490304 attribute has a cardinality of zero or one 4490306 meaning that for each instance of the ProductionPlanningOrder 449018 entity there may be one CollectiveOrderLeadingIndicator 4490304 attribute.

The RequirementsSummarydIndicator 4490310 attribute is an Indicator 4490314 datatype. The RequirementsSummarydIndicator 4490310 attribute has a cardinality of zero or one 4490312 meaning that for each instance of the ProductionPlanningOrder 449018 entity there may be one RequirementsSummarydIndicator 4490310 attribute.

The RepetitiveManufacturingUsedIndicator 4490316 attribute is an Indicator 4490320 datatype. The RepetitiveManufacturingUsedIndicator 4490316 attribute has a cardinality of zero or one 4490318 meaning that for each instance of the ProductionPlanningOrder 449018 entity there may be one RepetitiveManufacturingUsedIndicator 4490316 attribute.

The KanbanReplenishmentElementRoleIndicator 4490322 attribute is an Indicator 4490326 datatype. The KanbanReplenishmentElementRoleIndicator 4490322 attribute has a cardinality of zero or one 4490324 meaning that for each instance of the ProductionPlanningOrder 449018 entity there may be one KanbanReplenishmentElementRoleIndicator 4490322 attribute.

The BasicStartDate 4490328 attribute is a Date 4490332 datatype. The BasicStartDate 4490328 attribute has a cardinality of one 4490330 meaning that for each instance of the ProductionPlanningOrder 449018 entity there is one BasicStartDate 4490328 attribute.

The BasicEndDate 4490334 attribute is a Date 4490338 datatype. The BasicEndDate 4490334 attribute has a cardinality of one 4490336 meaning that for each instance of the ProductionPlanningOrder 449018 entity there is one BasicEndDate 4490334 attribute.

The PlannedOpeningDate 4490340 attribute is a Date 4490344 datatype. The PlannedOpeningDate 4490340 attribute has a cardinality of zero or one 4490342 meaning that for each instance of the ProductionPlanningOrder 449018 entity there may be one PlannedOpeningDate 4490340 attribute.

The ProductionMasterDataExplosionDate 4490346 attribute is a Date 4490350 datatype. The ProductionMasterDataExplosionDate 4490346 attribute has a cardinality of zero or one 4490348 meaning that for each instance of the ProductionPlanningOrder 449018 entity there may be one ProductionMasterDataExplosionDate 4490346 attribute.

The TotalAvailabilityDate 4490352 attribute is a Date 4490356 datatype. The TotalAvailabilityDate 4490352 attribute has a cardinality of zero or one 4490354 meaning that for each instance of the ProductionPlanningOrder 449018 entity there may be one TotalAvailabilityDate 4490352 attribute.

The ScheduledStartDateTime 4490358 attribute is a DateTime 4490362 datatype. The ScheduledStartDateTime 4490358 attribute has a cardinality of zero or one 4490360 meaning that for each instance of the ProductionPlanningOrder 449018 entity there may be one ScheduledStartDateTime 4490358 attribute.

The ScheduledEndDateTime 4490364 attribute is a DateTime 4490368 datatype. The ScheduledEndDateTime 4490364 attribute has a cardinality of zero or one 4490366 meaning that for each instance of the ProductionPlanningOrder 449018 entity there may be one ScheduledEndDateTime 4490364 attribute.

The SequencePlanningStartDateTime 4490370 attribute is a DateTime 4490374 datatype. The SequencePlanningStartDateTime 4490370 attribute has a cardinality of zero or one 4490372 meaning that for each instance of the ProductionPlanningOrder 449018 entity there may be one SequencePlanningStartDateTime 4490370 attribute.

The SequencePlanningEndDateTime 4490376 attribute is a DateTime 4490380 datatype. The SequencePlanningEndDateTime 4490376 attribute has a cardinality of zero or one 4490378 meaning that for each instance of the ProductionPlanningOrder 449018 entity there may be one SequencePlanningEndDateTime 4490376 attribute.

The PlannedTotalQuantity 4490382 attribute is a Quantity 4490386 datatype. The PlannedTotalQuantity 4490382 attribute has a cardinality of one 4490384 meaning that for each instance of the ProductionPlanningOrder 449018 entity there is one PlannedTotalQuantity 4490382 attribute.

The ExpectedScrapQuantity 4490388 attribute is a Quantity 4490392 datatype. The ExpectedScrapQuantity 4490388 attribute has a cardinality of one 4490390 meaning that for each instance of the ProductionPlanningOrder 449018 entity there is one ExpectedScrapQuantity 4490388 attribute.

The DeliveredQuantity 4490394 attribute is a Quantity 4490398 datatype. The DeliveredQuantity 4490394 attribute has a cardinality of zero or one 4490396 meaning that for each instance of the ProductionPlanningOrder 449018 entity there may be one DeliveredQuantity 4490394 attribute.

The IssuedQuantity 4490400 attribute is a Quantity 4490404 datatype. The IssuedQuantity 4490400 attribute has a cardinality of zero or one 4490402 meaning that for each instance of the ProductionPlanningOrder 449018 entity there may be one IssuedQuantity 4490400 attribute.

The InputMaterial 4490406 package is an InputMaterial 4490412 datatype. The InputMaterial 4490406 package includes an InputMaterial 4490408 entity.

The InputMaterial 4490408 entity has a cardinality of zero or n 4490410 meaning that for each instance of the ProductionPlanningOrder 449018 entity there may be one or more InputMaterial 4490408 entities. The InputMaterial 4490408 entity includes various attributes, namely MaterialInternalID 4490414, PlantID 4490420, InventoryManagedLocationInternalID 4490426, ProductionBillOfMaterialItemID 4490432, EngineeringChangeRequestID 4490438, LogisticsAreaID 4490444, LogisticsAreaTypeCode 4490450, LogisticsAreaTypeName 4490456, LogisticsItemTypeCode 4490462, LogisticsItemTypeName 4490468, InventorySpecialStockTypeCode 4490474, InventorySpecialStockTypeName 4490480, ProductionQuantityDistributionCode 4490486, ProductionQuantityDistributionName 4490492, MaterialRequirementsPlanningTypeCode 4490498, MaterialRequirementsPlanningTypeName 4490504, MaterialDescription 4490510, PhantomAssemblyIndicator 4490516, QuantityFixedIndicator 4490522, RequirementDate 4490528, LatestRequirementDate 4490534, RequirementQuantity 4490540, ExpectedScrapPercent 4490546 and AvailableQuantity 4490552.

The MaterialInternalID 4490414 attribute is a ProductInternalID 4490418 datatype. The MaterialInternalID 4490414 attribute has a cardinality of one 4490416 meaning that for each instance of the InputMaterial 4490408 entity there is one MaterialInternalID 4490414 attribute.

The PlantID 4490420 attribute is a PlantID 4490424 datatype. The PlantID 4490420 attribute has a cardinality of one 4490422 meaning that for each instance of the InputMaterial 4490408 entity there is one PlantID 4490420 attribute.

The InventoryManagedLocationInternalID 4490426 attribute is a LocationInternalID 4490430 datatype. The InventoryManagedLocationInternalID 4490426 attribute has a cardinality of zero or one 4490428 meaning that for each instance of the InputMaterial 4490408 entity there may be one InventoryManagedLocationInternalID 4490426 attribute.

The ProductionBillOfMaterialItemID 4490432 attribute is a ProductionBillOfMaterialItemID 4490436 datatype. The ProductionBillOfMaterialItemID 4490432 attribute has a cardinality of zero or one 4490434 meaning that for each instance of the InputMaterial 4490408 entity there may be one ProductionBillOfMaterialItemID 4490432 attribute.

The EngineeringChangeRequestID 4490438 attribute is an EngineeringChangeRequestID 4490442 datatype. The EngineeringChangeRequestID 4490438 attribute has a cardinality of zero or one 4490440 meaning that for each instance of the InputMaterial 4490408 entity there may be one EngineeringChangeRequestID 4490438 attribute.

The LogisticsAreaID 4490444 attribute is a LogisticsAreaID 4490448 datatype. The LogisticsAreaID 4490444 attribute has a cardinality of zero or one 4490446 meaning that for each instance of the InputMaterial 4490408 entity there may be one LogisticsAreaID 4490444 attribute.

The LogisticsAreaTypeCode 4490450 attribute is a LogisticsAreaTypeCode 4490454 datatype. The LogisticsAreaTypeCode 4490450 attribute has a cardinality of zero or one 4490452 meaning that for each instance of the InputMaterial 4490408 entity there may be one LogisticsAreaTypeCode 4490450 attribute.

The LogisticsAreaTypeName 4490456 attribute is a LogisticsAreaTypeName 4490460 datatype. The LogisticsAreaTypeName 4490456 attribute has a cardinality of zero or one 4490458 meaning that for each instance of the InputMaterial 4490408 entity there may be one LogisticsAreaTypeName 4490456 attribute.

The LogisticsItemTypeCode 4490462 attribute is a LogisticsItemTypeCode 4490466 datatype. The LogisticsItemTypeCode 4490462 attribute has a cardinality of one 4490464 meaning that for each instance of the InputMaterial 4490408 entity there is one LogisticsItemTypeCode 4490462 attribute.

The LogisticsItemTypeName 4490468 attribute is a LogisticsItemTypeName 4490472 datatype. The LogisticsItemTypeName 4490468 attribute has a cardinality of one 4490470 meaning that for each instance of the InputMaterial 4490408 entity there is one LogisticsItemTypeName 4490468 attribute.

The InventorySpecialStockTypeCode 4490474 attribute is an InventorySpecialStockTypeCode 4490478 datatype. The InventorySpecialStockTypeCode 4490474 attribute has a cardinality of zero or one 4490476 meaning that for each instance of the InputMaterial 4490408 entity there may be one InventorySpecialStockTypeCode 4490474 attribute.

The InventorySpecialStockTypeName 4490480 attribute is an InventorySpecialStockTypeName 4490484 datatype. The InventorySpecialStockTypeName 4490480 attribute has a cardinality of zero or one 4490482 meaning that for each instance of the InputMaterial 4490408 entity there may be one InventorySpecialStockTypeName 4490480 attribute.

The ProductionQuantityDistributionCode 4490486 attribute is a ProductionQuantityDistributionCode 4490490 datatype. The ProductionQuantityDistributionCode 4490486 attribute has a cardinality of zero or one 4490488 meaning that for each instance of the InputMaterial 4490408 entity there may be one ProductionQuantityDistributionCode 4490486 attribute.

The ProductionQuantityDistributionName 4490492 attribute is a ProductionQuantityDistributionName 4490496 datatype. The ProductionQuantityDistributionName 4490492 attribute has a cardinality of zero or one 4490494 meaning that for each instance of the InputMaterial 4490408 entity there may be one ProductionQuantityDistributionName 4490492 attribute.

The MaterialRequirementsPlanningTypeCode 4490498 attribute is a MaterialRequirementsPlanningTypeCode 4490502 datatype. The MaterialRequirementsPlanningTypeCode 4490498 attribute has a cardinality of zero or one 4490500 meaning that for each instance of the InputMaterial 4490408 entity there may be one MaterialRequirementsPlanningTypeCode 4490498 attribute.

The MaterialRequirementsPlanningTypeName 4490504 attribute is a MaterialRequirementsPlanningTypeName 4490508 datatype. The MaterialRequirementsPlanningTypeName 4490504 attribute has a cardinality of zero or one 4490506 meaning that for each instance of the InputMaterial 4490408 entity there may be one MaterialRequirementsPlanningTypeName 4490504 attribute.

The MaterialDescription 4490510 attribute is a ProductDescription 4490514 datatype. The MaterialDescription 4490510 attribute has a cardinality of zero or one 4490512 meaning that for each instance of the InputMaterial 4490408 entity there may be one MaterialDescription 4490510 attribute.

The PhantomAssemblyIndicator 4490516 attribute is an Indicator 4490520 datatype. The PhantomAssemblyIndicator 4490516 attribute has a cardinality of zero or one 4490518 meaning that for each instance of the InputMaterial 4490408 entity there may be one PhantomAssemblyIndicator 4490516 attribute.

The QuantityFixedIndicator 4490522 attribute is an Indicator 4490526 datatype. The QuantityFixedIndicator 4490522 attribute has a cardinality of zero or one 4490524 meaning that for each instance of the InputMaterial 4490408 entity there may be one QuantityFixedIndicator 4490522 attribute.

The RequirementDate 4490528 attribute is a Date 4490532 datatype. The RequirementDate 4490528 attribute has a cardinality of one 4490530 meaning that for each instance of the InputMaterial 4490408 entity there is one RequirementDate 4490528 attribute.

The LatestRequirementDate 4490534 attribute is a Date 4490538 datatype. The LatestRequirementDate 4490534 attribute has a cardinality of zero or one 4490536 meaning that for each instance of the InputMaterial 4490408 entity there may be one LatestRequirementDate 4490534 attribute.

The RequirementQuantity 4490540 attribute is a Quantity 4490544 datatype. The RequirementQuantity 4490540 attribute has a cardinality of one 4490542 meaning that for each instance of the InputMaterial 4490408 entity there is one RequirementQuantity 4490540 attribute.

The ExpectedScrapPercent 4490546 attribute is a Percent 4490550 datatype. The ExpectedScrapPercent 4490546 attribute has a cardinality of zero or one 4490548 meaning that for each instance of the InputMaterial 4490408 entity there may be one ExpectedScrapPercent 4490546 attribute.

The AvailableQuantity 4490552 attribute is a Quantity 4490556 datatype. The AvailableQuantity 4490552 attribute has a cardinality of zero or one 4490554 meaning that for each instance of the InputMaterial 4490408 entity there may be one AvailableQuantity 4490552 attribute.

The OutputMaterial 4490558 package is an OutputMaterial 4490564 datatype. The OutputMaterial 4490558 package includes an OutputMaterial 4490560 entity.

The OutputMaterial 4490560 entity has a cardinality of one or n 4490562 meaning that for each instance of the ProductionPlanningOrder 449018 entity there are one or more OutputMaterial 4490560 entities. The OutputMaterial 4490560 entity includes various attributes, namely MaterialInternalID 4490566, SupplyPlanningAreaID 4490572, InventoryManagedLocationID 4490578, EngineeringChangeRequestID 4490584, InventorySpecialStockTypeCode 4490590, InventorySpecialStockTypeName 4490596, ProductionQuantityDistributionCode 4490602, ProductionQuantityDistributionName 4490608, MaterialDescription 4490614, PhantomAssemblyIndicator 4490620, ReceiptDate 4490626, EarliestReceiptDate 4490632, GoodsReceiptProcessingTime 4490638, ReceiptQuantity 4490644, ExpectedScrapQuantity 4490650 and AvailableQuantity 4490656.

The MaterialInternalID 4490566 attribute is a ProductInternalID 4490570 datatype. The MaterialInternalID 4490566 attribute has a cardinality of one 4490568 meaning that for each instance of the OutputMaterial 4490560 entity there is one MaterialInternalID 4490566 attribute.

The SupplyPlanningAreaID 4490572 attribute is a SupplyPlanningAreaID 4490576 datatype. The SupplyPlanningAreaID 4490572 attribute has a cardinality of one 4490574 meaning that for each instance of the OutputMaterial 4490560 entity there is one SupplyPlanningAreaID 4490572 attribute.

The InventoryManagedLocationID 4490578 attribute is a LocationInternalID 4490582 datatype. The InventoryManagedLocationID 4490578 attribute has a cardinality of zero or one 4490580 meaning that for each instance of the OutputMaterial 4490560 entity there may be one InventoryManagedLocationID 4490578 attribute.

The EngineeringChangeRequestID 4490584 attribute is an EngineeringChangeRequestID 4490588 datatype. The EngineeringChangeRequestID 4490584 attribute has a cardinality of zero or one 4490586 meaning that for each instance of the OutputMaterial 4490560 entity there may be one EngineeringChangeRequestID 4490584 attribute.

The InventorySpecialStockTypeCode 4490590 attribute is an InventorySpecialStockTypeCode 4490594 datatype. The InventorySpecialStockTypeCode 4490590 attribute has a cardinality of zero or one 4490592 meaning that for each instance of the OutputMaterial 4490560 entity there may be one InventorySpecialStockTypeCode 4490590 attribute.

The InventorySpecialStockTypeName 4490596 attribute is an InventorySpecialStockTypeName 4490600 datatype. The InventorySpecialStockTypeName 4490596 attribute has a cardinality of zero or one 4490598 meaning that for each instance of the OutputMaterial 4490560 entity there may be one InventorySpecialStockTypeName 4490596 attribute.

The ProductionQuantityDistributionCode 4490602 attribute is a ProductionQuantityDistributionCode 4490606 datatype. The ProductionQuantityDistributionCode 4490602 attribute has a cardinality of zero or one 4490604 meaning that for each instance of the OutputMaterial 4490560 entity there may be one ProductionQuantityDistributionCode 4490602 attribute.

The ProductionQuantityDistributionName 4490608 attribute is a ProductionQuantityDistributionName 4490612 datatype. The ProductionQuantityDistributionName 4490608 attribute has a cardinality of zero or one 4490610 meaning that for each instance of the OutputMaterial 4490560 entity there may be one ProductionQuantityDistributionName 4490608 attribute.

The MaterialDescription 4490614 attribute is a ProductDescription 4490618 datatype. The MaterialDescription 4490614 attribute has a cardinality of zero or one 4490616 meaning that for each instance of the OutputMaterial 4490560 entity there may be one MaterialDescription 4490614 attribute.

The PhantomAssemblyIndicator 4490620 attribute is an Indicator 4490624 datatype. The PhantomAssemblyIndicator 4490620 attribute has a cardinality of zero or one 4490622 meaning that for each instance of the OutputMaterial 4490560 entity there may be one PhantomAssemblyIndicator 4490620 attribute.

The ReceiptDate 4490626 attribute is a Date 4490630 datatype. The ReceiptDate 4490626 attribute has a cardinality of one 4490628 meaning that for each instance of the OutputMaterial 4490560 entity there is one ReceiptDate 4490626 attribute.

The EarliestReceiptDate 4490632 attribute is a Date 4490636 datatype. The EarliestReceiptDate 4490632 attribute has a cardinality of zero or one 4490634 meaning that for each instance of the OutputMaterial 4490560 entity there may be one EarliestReceiptDate 4490632 attribute.

The GoodsReceiptProcessingTime 4490638 attribute is a DateTimePeriod 4490642 datatype. The GoodsReceiptProcessingTime 4490638 attribute has a cardinality of zero or one 4490640 meaning that for each instance of the OutputMaterial 4490560 entity there may be one GoodsReceiptProcessingTime 4490638 attribute.

The ReceiptQuantity 4490644 attribute is a Quantity 4490648 datatype. The ReceiptQuantity 4490644 attribute has a cardinality of one 4490646 meaning that for each instance of the OutputMaterial 4490560 entity there is one ReceiptQuantity 4490644 attribute.

The ExpectedScrapQuantity 4490650 attribute is a Quantity 4490654 datatype. The ExpectedScrapQuantity 4490650 attribute has a cardinality of zero or one 4490652 meaning that for each instance of the OutputMaterial 4490560 entity there may be one ExpectedScrapQuantity 4490650 attribute.

The AvailableQuantity 4490656 attribute is a Quantity 4490660 datatype. The AvailableQuantity 4490656 attribute has a cardinality of zero or one 4490658 meaning that for each instance of the OutputMaterial 4490560 entity there may be one AvailableQuantity 4490656 attribute.

The CapacityRequirement 4490662 package is a CapacityRequirement 4490668 datatype. The CapacityRequirement 4490662 package includes a CapacityRequirement 4490664 entity.

The CapacityRequirement 4490664 entity has a cardinality of zero or n 4490666 meaning that for each instance of the ProductionPlanningOrder 449018 entity there may be one or more CapacityRequirement 4490664 entities. The CapacityRequirement 4490664 entity includes various attributes, namely ProductionPlanningOrderSequenceID 4490670, OperationID 4490676, OperationActivityID 4490682, WorkCentreID 4490688, CapacityCategoryCode 4490694, CapacityCategoryName 4490700, OperationStartDate 4490706, OperationEndDate 4490712 and Quantity 4490718.

The ProductionPlanningOrderSequenceID 4490670 attribute is a ProductionPlanningOrderSequenceID 4490674 datatype. The ProductionPlanningOrderSequenceID 4490670 attribute has a cardinality of one 4490672 meaning that for each instance of the CapacityRequirement 4490664 entity there is one ProductionPlanningOrderSequenceID 4490670 attribute.

The OperationID 4490676 attribute is an OperationID 4490680 datatype. The OperationID 4490676 attribute has a cardinality of one 4490678 meaning that for each instance of the CapacityRequirement 4490664 entity there is one OperationID 4490676 attribute.

The OperationActivityID 4490682 attribute is an OperationActivityID 4490686 datatype. The OperationActivityID 4490682 attribute has a cardinality of one 4490684 meaning that for each instance of the CapacityRequirement 4490664 entity there is one OperationActivityID 4490682 attribute.

The WorkCentreID 4490688 attribute is a WorkCentreID 4490692 datatype. The WorkCentreID 4490688 attribute has a cardinality of one 4490690 meaning that for each instance of the CapacityRequirement 4490664 entity there is one WorkCentreID 4490688 attribute.

The CapacityCategoryCode 4490694 attribute is a CapacityCategoryCode 4490698 datatype. The CapacityCategoryCode 4490694 attribute has a cardinality of one 4490696 meaning that for each instance of the CapacityRequirement 4490664 entity there is one CapacityCategoryCode 4490694 attribute.

The CapacityCategoryName 4490700 attribute is a CapacityCategoryName 4490704 datatype. The CapacityCategoryName 4490700 attribute has a cardinality of one 4490702 meaning that for each instance of the CapacityRequirement 4490664 entity there is one CapacityCategoryName 4490700 attribute.

The OperationStartDate 4490706 attribute is a DateTime 4490710 datatype. The OperationStartDate 4490706 attribute has a cardinality of one 4490708 meaning that for each instance of the CapacityRequirement 4490664 entity there is one OperationStartDate 4490706 attribute.

The OperationEndDate 4490712 attribute is a DateTime 4490716 datatype. The OperationEndDate 4490712 attribute has a cardinality of one 4490714 meaning that for each instance of the CapacityRequirement 4490664 entity there is one OperationEndDate 4490712 attribute.

The Quantity 4490718 attribute is a Quantity 4490722 datatype. The Quantity 4490718 attribute has a cardinality of one 4490720 meaning that for each instance of the CapacityRequirement 4490664 entity there is one Quantity 4490718 attribute.

The Log 4490724 package is a Log 4490730 datatype. The Log 4490724 package includes a Log 4490726 entity.

The Log 4490726 entity has a cardinality of one 4490728 meaning that for each instance of the ProductionPlanningOrderByIDResponseMessage_sync 449002 entity there is one Log 4490726 entity.

MessageHeader Package

A MessageHeader package groups the business information that is relevant for sending a business document in a message.

MessageHeader

A MessageHeader contains the information to identify a business document in a message from the perspective of the sending application. The MessageHeader optionally contains the element BasicBusinessDocumentMessageHeader. BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties ProductionPlanningOrder Package ProductionPlanningOrder package groups the information relevant to describe a ProductionPlanningOrder.

ProductionPlanningOrder

A ProductionPlanningOrder is a request made to a planning area (SupplyPlanningArea) to initiate the production of a particular quantity of a material on a defined date. The production planning order contains planning, administrative, and descriptive attributes.

The elements located directly at the ProductionPlanningOrder node are ID, MaterialInternalID, SupplyPlanningAreaID, PlantID, InventoryManagedLocationInternalID, MaterialRequirementsSupplyPlanningAreaID, MaterialRequirementsPlanningControllerID, SalesOrderID, SalesOrderItemID, ProjectWorkBreakdownStructureElementID, ReservationID, ProductionMasterDataExplosionDateID, ProductionBillOfMaterialVariantID, SuperiorReservationID, SuperiorReservationItemID, ProductionVersionID, ProductionSchedulerID, RequirementsTotalRecordsReservationID, SubcontractingVendorID, CapacityRequirementID, ProductionBillOfOperationsGroupID, ProductionBillOfOperationsID, ProcurementTypeCode, ProcurementTypeName, AccountCodingBlockTypeCode, AccountCodingBlockTypeName, InventorySpecialStockTypeCode, InventorySpecialStockTypeName, ProductionBillOfMaterialVariantUsageCode, ProductionBillOfMaterialVariantUsageName, ProductAvailabilityConfirmationStatusCode, ProductAvailabilityConfirmationStatusName, AvailabilityCheckTypeCode, AvailabilityCheckTypeName, InventorySpecialStockValuationTypeCode, InventorySpecialStockValuationTypeName, ProductionBillOfOperationsTypeCode, ProductionBillOfOperationsTypeName, LogisticsSchedulingTypeCode, LogisticsSchedulingTypeName, LogisticsSchedulingReturnCode, LogisticsSchedulingReturnName, ConvertIndicator, FixedIndicator, BillOfMaterialExplosionFixedIndicator, CapacityDispatchedIndicator, AssemblyOrderProcessingUsedIndicator, CollectiveOrderLeadingIndicator, RequirementsSummaryIndicator, RepetitiveManufacturingUsedIndicator, KanbanProductionReplenishmentIndicator, BasicStartDate, BasicEndDate, PlannedOpeningDate, ProductionMasterDataExplosionDate, TotalPlannedQuantityAvailabilityDate, ScheduledStartDateTime, ScheduledEndDateTime, SequencePlanningStartDateTime, SequencePlanningEndDateTime, PlannedTotalQuantity, ExpectedScrapQuantity, DeliveredQuantity, and IssuedQuantity.

ID is the unique identifier of the returned production planning order. MaterialInternalID is the unique identifier of the main material output produced by the production planning order. SupplyPlanningAreaID identifies the plant the production planning order is planned in. In this plant the main material output will be stored. PlantID, which can be optional, identifies the plant in which the production planning order will be produced. InventoryManagedLocationID, which can be optional, is the unique identifier of the inventory managed location in the context of the specified SupplyPlanningAreaID the produced material will be stored. MaterialRequirementsSupplyPlanningAreaID, which can be optional, identifies a material requirements supply planning area in which the production planning order is being planned. MaterialRequirementsPlanningControllerID, which can be optional, identifies the material requirements planning controller assigned to the production planning order. SalesOrderID is the unique identifier of the sales order the production planning order is assigned to. SalesOrderItemID is the unique identifier of a sales order item in the context of a sales order ID the production planning order is assigned to. ProjectWorkBreakdownStructureElementID identifies a single structure element of the project the production planning order is assigned to. ReservationID is a unique identifier of the corresponding dependent requirement reservations of the production planning order. ProductionMasterDataExplosionID, which can be optional, identifies the explosion date of the production master data (bill of material and bill of operations) which is used in the production planning order. ProductionBillOfMaterialVariantID, which can be optional, identifies the alternative of the production bill of material which is used in the production planning order.

SuperiorReservationID, which can be optional, is a unique identifier of the corresponding ReservationID of the superior production planning order within a collective production planning order. SuperiorReservationItemID, which can be optional, identifies ReservationItemID of the superior production planning order within a collective production planning order. ProductionVersionID, which can be optional, is a unique identifier of a production version assigned to the production planning order. ProductionSchedulerID, which can be optional, identifies the production scheduler assigned to the production planning order. RequirementsTotalRecordsReservationED, which can be optional, is a unique identifier for a reservation which is a requirements total record. SubcontractingVendorID, which can be optional, identifies a subcontracting vendor assigned to the production planning order.

CapacityRequirementID, which can be optional, is the unique identifier of a capacity requirement resulting from the scheduling of the production planning order. ProductionBillOfOperationsGroupID, which can be optional, is an identifier of the production bill of operations group that is used by the production planning order. A production bill of operations group is a group of several production bills of operations whose logical features are largely the same. ProductionBillOfOperationsID, which can be optional, is an identifier of the production bill of operations that is used by the production planning order. It may be unique in the context of a ProductionBillOfOperationsGroupID and a ProductionBillOfOperationsTypeCode. ProcurementTypeCode is a coded representation of the assigned procurement type. ProcurementTypeName is the name of the assigned procurement type. AccountCodingBlockTypeCode is a coded representation of the type of coding block. It determines which objects of a coding block can or need to be specified in the production planning order. AccountCodingBlockTypeName is the name of the assigned account coding block type code. InventorySpecialStockTypeCode is a coded representation of the special stock the main material output is stored in, e.g. pipeline stock, sales order stock, project stock. InventorySpecialStockTypeName is the name of the assigned inventory special stock type code. ProductionBillOfMaterialVariantUsageCode, which can be optional, is a coded representation of the usage of the variant of the production bill of material which is used.

ProductionBillOfMaterialVariantUsageName, which can be optional, is the name of the production bill of material variant usage of the production bill of material which is used. ProductAvailabilityConfirmationStatusCode, which can be optional, is a coded representation of the result of the availability check executed. ProductAvailabilityConfirmationStatusName, which can be optional, is the name of the result of the availability check executed. ProductAvailabilityCheckTypeCode, which can be optional, is a coded representation of the type of the availability check executed for the production planning order. AvailabilityCheckTypeName, which can be optional, is the name of the type of the availability check executed. InventorySpecialStockValuationTypeCode, which can be optional, is the coded representation of the type of the valuation of the inventory special stock the main material output material is stored in. InventorySpecialStockValuationTypeName, which can be optional, is the name of the InventorySpecialStockValuationType assigned to the main material output. ProductionBillOfOperationsTypeCode, which can be optional, is the coded representation of the type of production bill of operations which was used for scheduling the production planning order. ProductionBillOfOperationsTypeCode is used to group production bills of operations by their use. ProductionBillOfOperationsTypeName, which can be optional, is the name of the type of production bill of operations. LogisticsSchedulingTypeCode, which can be optional, is the coded representation of the type of LogisticsScheduling. It determines e.g. whether the dates of the production planning order should be scheduled forwards or backwards. LogisticsSchedulingTypeName, which can be optional, is the name of the type of logistics scheduling. LogisticsSchedulingReturnCode, which can be optional, is the coded representation of the return messages from the production planning order logistics scheduling. LogisticsSchedulingReturnName, which can be optional, is the name of the return messages from the production planning order logistics scheduling. DeletedIndicator, which can be optional, indicates that production planning order can be converted. FixedIndicator indicates that the production planning order is fixed. BillOfMaterialsFixedIndicator indicates that the explosion of the used bill of material is fixed. CapacityDispatchedIndicator, which can be optional, indicates that the capacities of the production planning order are dispatched. AssemblyOrderProcessingUsedIndicator, which can be optional, indicates that the production planning order is used within assembly order processing. CollectiveOrderLeadingIndicator, which can be optional, indicates that the production planning order is the leading planning order within a collective order aggregation. RequirementsSummaryIndicator, which can be optional, indicates whether requirements on the same day are summarized to a total requirement. RepetitiveManufacturingUsedIndicator, which can be optional, indicates that the production planning order is used in and for repetitive manufacturing. KanbanProductionReplenishmentIndicator, which can be optional, indicates that the production planning order is a production replenishment for Kanban. BasicStartDate is the date on which the production of the planning order should start. It represents the earliest start date for the scheduling of the production planning order. BasicEndDate is the date on which the production of the planning order should end. It represents the latest end date for the scheduling of the production planning order. PlannedOpeningDate, which can be optional, is the date on which the production planning order should be opened, i.e. being converted into a production order. ProductionMasterDataExplosionDate, which can be optional, is the date which is used to determine the valid bill of material and production bill of operations. TotalPlannedQuantityAvailabilityDate, which can be optional, is the date on which the total planned quantity will be available. ScheduledStartDateTime, which can be optional, is the scheduled start time point of the production planning order. It is being calculated from the scheduling of the production planning order. ScheduledEndDateTime, which can be optional, is the scheduled end date of the production planning order. It is being calculated from the scheduling of the production planning order. SequencePlanningStartDateTime, which can be optional, is the scheduled start time point of the production planning order calculated from sequence planning. SequencePlanningEndDateTime, which can be optional, is the scheduled end time point of the production planning order calculated from sequence planning. PlannedTotalQuantity is the planned total quantity (yield+scrap) of the main material output to be produced by the production planning order. ExpectedScrapQuantity is the expected quantity of the main material output that will not meet the quality requirements. DeliveredQuantity, which can be optional, is the already delivered quantity of the main material output after confirmation. IssuedQuantity, which can be optional, is the already issued (received) quantity of the main material output. Typically, BillOfMaterialExplosionFixedIndicator can be a constraint since BillOfMaterialExplosionFixedIndicator can be active if FixedIndicator is active.

Component Package

MaterialInput

MaterialInput represents a material which is needed for producing the output materials. The elements located directly at the MaterialInput node are MaterialInternalID, PlantID, InventoryManagedLocationInternalID, ProductionBillOfMaterialItemID, EngineeringChangeRequestID, LogisticsAreaID, LogisticsAreaTypeCode, LogisticsAreaTypeName, LogisticsItemTypeCode, LogisticsItemTypeName, InventorySpecialStockTypeCode, InventorySpecialStockTypeName, ProductionQuantityDistributionCode, ProductionQuantityDistributionName, MaterialRequirementsPlanningTypeCode, MaterialRequirementsPlanningTypeName, MaterialDescription, PhantomIndicator, QuantityFixedIndicator, RequirementDate, LatestRequirementDate, RequirementQuantity, ExpectedScrapPercent, and AvailableQuantity.

MaterialInternalID is the unique identifier of an input material required for the production of the output materials. PlantID is the unique identifier of the plant the input material is stored in. InventoryManagedLocationID, which can be optional, is the unique identifier of the inventory managed location in the context of the specified plant ID the input material is stored in. ProductionBillOfMaterialItemID, which can be optional, is the unique identifier of the item number of the input material within the production bill of material the material was exploded from. EngineeringChangeRequestID, which can be optional, identifies the change request number the assigned production bill of material was changed with. SupplyLogisticsAreaID, which can be optional, identifies the supply logistics area the input material is associated with. LogisticsAreaTypeCode, which can be optional, specifies the type of the logistics area identifier. LogisticsAreaTypeName, which can be optional, is the name of the type of a logistics area. LogisticsItemTypeCode is the coded representation of the type of the material input item, e.g. whether the material is a stock item, a non-stock item or a text item. LogisticsItemTypeName is the name of the type of a LogisticsItem. InventorySpecialStockTypeCode, which can be optional, is a coded representation of the special stock the goods issue is withdrawn from, e.g. sales order stock, project stock. InventorySpecialStockTypeName, which can be optional, is the name of the inventory special stock type code assigned to the material input. ProductionQuantityDistributionCode, which can be optional, is a coded representation of the production quantity distribution code assigned to the material output. ProductionQuantityDistributionName, which can be optional, is the name of the production quantity distribution code assigned to the material output. MaterialRequirementsPlanningTypeCode, which can be optional, is a coded representation of the procedure which is used in MaterialRequirementsPlanning for planning the input material. MaterialRequirementsPlanningTypeName, which can be optional, is the name of the MaterialRequirementsPlanningType code assigned to the input material. MaterialDescription, which can be optional, is the description of the material input. PhantomIndicator, which can be optional, indicates whether a material input is a phantom or not. QuantityFixedIndicator, which can be optional, indicates that the quantity of the material input is fixed. RequirementDate, which can be optional, is the date on which the requested quantity of the input material is required for production. LatestRequirementDate, which can be optional, is the date on which the requested quantity of the input material is required at latest. This date indicates the end of the requirements period for the QuantityDistributionCode. RequirementQuantity, which can be optional, is the required quantity of the input material. ExpectedScrapPercent, which can be optional, is the expected percent of the quantity of the input material that will not meet the quality requirements. AvailableQuantity, which can be optional, is the quantity of an input material promised to be available for production, determined by the availability check. Typically, LogisticsAreaTypeCode can be filled if LogisticsAreaID is filled.

MaterialOutput

MaterialOutput represents a material which is planned to be produced. The elements located directly at the MaterialOutput node are MaterialInternalID, SupplyPlanningAreaID, InventoryManagedLocationInternalID, EngineeringChangeRequestID, InventorySpecialStockTypeCode, InventorySpecialStockTypeName, ProductionQuantityDistributionCode, ProductionQuantityDistributionName, MaterialDescription, PhantomAssemblyIndicator, ReceiptDate, EarliestReceiptDate, GoodsReceiptProcessingTime, ReceiptQuantity, ExpectedScrapQuantity, and AvailableQuantity. MaterialInternalID is the unique identifier of a material output produced by the production planning order. SupplyPlanningAreaID is the unique identifier of the plant the material output is stored in. InventoryManagedLocationID, which can be optional, is the unique identifier of the inventory managed location in the context of the specified plant ID the material output is stored in. EngineeringChangeRequestID, which can be optional, identifies the change request number the assigned production bill of material was changed with. InventorySpecialStockTypeCode is a coded representation of the special stock the goods issue is withdrawn from, e.g. sales order stock, project stock. InventorySpecialStockTypeName is the name of the inventory special stock type code assigned to the material output. ProductionQuantityDistributionCode, which can be optional, is a coded representation of the production quantity distribution code assigned to the material output. ProductionQuantityDistributionName, which can be optional, is the name of the production quantity distribution code assigned to the material output. MaterialDescription, which can be optional, is the description of the material output. PhantomAssemblyIndicator, which can be optional, indicates whether a material output is a phantom assembly or not. ReceiptDate is the date on which the output material is planned to be received. EarliestReceiptDate, which can be optional, is the date on which the output material is planned to be received at earliest. This date indicates the start of the period for the QuantityDistributionCode. GoodsReceiptProcessingTime, which can be optional, is the time period which is needed for goods receipt processing. ReceiptQuantity is the quantity of the output material which is planned to be received. ExpectedScrapQuantity, which can be optional, is the expected quantity of the material output that will not meet the quality requirements. AvailableQuantity, which can be optional, is the quantity of the main material output that will be available after the availability check for the input materials has been carried out. AvailableQuantity can be available if material output is of specialization ByProductMaterialOutput.

CapacityRequirement Package

CapacityRequirement

CapacityRequirement represents the capacity of a work centre which is planned to be required for production execution. It specifies how much capacity of a resource is necessary at a specific time point. The elements located directly at the CapacityRequirement node are ProductionPlanningOrderSequenceID, OperationID, OperationActivityID, WorkCentreID, OperationStartDate, OperationEndDate, CapacityCategoryCode, CapacityCategoryName, and Quantity. ProductionPlanningOrderSequenceID is the unique identifier of a sequence of operations according to the ProductionBillOfOperations which was used for scheduling the production planning order. OperationID identifies the operation of a production planning order. The OperationID is used to determine in which order the operations of the production bill of operations are carried out. OperationActivityID identifies a processing section in a production planning order operation. WorkCentreID identifies the work centre on which the capacity requirement is planned. OperationStartDate is the date on which the operation is scheduled to start. OperationEndDate is the date on which the operation is scheduled to end. CapacityCategoryCode is a coded representation of a capacity category. It describes the capacity more in detail, e.g. it determines whether the capacity is a machine, labor or other capacity. CapacityCategoryName is the name for the capacity category. Quantity is the capacity requirements quantity that is planned for the operation.

Log Package

Log

A log is a sequence of messages that may result from the execution of an application task.

ProductionPlanningOrder SCM Interfaces

Production planners and production schedulers need to be able to get an overview over the production planning orders that are planned for covering internal and external requirements. They also need to know material requirements at the component level and capacity requirements caused by these production planning orders. Within the material requirements planning a production planning order is a request to initiate the in-house production of a particular quantity of a material on a defined date.

Message Choreography

The message choreography of FIG. 452 describes a possible logical sequence of messages that can be used to realize a production planning order business scenario.

The message sent ProductionPlanningOrderCreateRequest_sync is sent from the Production Planner/Production Scheduler to create a Production Planning Order in Supply and Demand Matching. The structure of the message type ProductionPlanningOrderCreateRequest_sync is specified by the message data type ProductionPlanningOrderCreateRequestMessage_sync.

The message ProductionPlanningOrderCreateConfirmation_sync is sent from Supply and Demand Matching to the Production Planner/Production Scheduler to confirm a ProductionPlanningOrderCreateRequest_sync. The structure of the message type ProductionPlanningOrderCreateConfirmation_sync is specified by the message data type ProductionPlanningOrderCreateConfirmationMessage_sync.

The message ProductionPlanningOrderChangeRequest_sync is sent from the Production Planner/Production Scheduler to change a ProductionPlanningOrder in Supply and Demand Matching. The structure of the message type ProductionPlanningOrderChangeRequest_sync is specified by the message data type ProductionPlanningOrderChangeRequestMessage_sync.

The message ProductionPlanningOrderChangeConfirmation_sync is sent from Supply and Demand Matching to the Production Planner/Production Scheduler to confirm a ProductionPlanningOrderChangeRequest_sync. The structure of the message type ProductionPlanningOrderChangeConfirmation_sync is specified by the message data type ProductionPlanningOrderChangeConfirmationMessage_sync.

The message ProductionPlanningOrderCancelRequest_sync is sent from a Production Planner/Production Scheduler to cancel a ProductionPlanningOrder in Supply and Demand Matching. The structure of the message type ProductionPlanningOrderCancelRequest_sync is specified by the message data type ProductionPlanningOrderCancelRequestMessage_sync.

The message ProductionPlanningOrderCancelConfirmation_sync is sent from Supply and Demand Matching to the Production Planner/Production Scheduler to confirm a ProductionPlanningOrderCancelRequest_sync. The structure of the message type ProductionPlanningOrderCancelConfirmation sync is specified by the message data type ProductionPlanningOrderCancelConfirmationMessage_sync.

The message ProductionPlanningOrderSimpleByElementsQuery_sync is an inquiry to Supply and Demand Matching for ProductionPlanningOrder basic information that satisfies the selection criteria specified in the query. The structure of the message type ProductionPlanningOrderSimpleByElementsQuery_sync is specified by the message data type ProductionPlanningOrderSimpleByElementsQueryMessage_sync.

The message ProductionPlanningOrderSimpleByElementsResponse_sync is a response to ProductionPlanningOrderSimpleByElementsQuery_sync. The structure of the message type ProductionPlanningOrderSimpleByElementsResponse_sync is specified by the message data type ProductionPlanningOrderSimpleByElementsResponseMessage_sync The message ProductionPlanningOrderByIDQuery_sync is an inquiry to Supply and Demand Matching to return complete information for one ProductionPlanningOrder that satisfies the selection criteria specified in the query. The structure of the message type ProductionPlanningOrderByIDQuery_sync is specified by the message data type ProductionPlanningOrderByIDQueryMessage_sync.

The message ProductionPlanningOrderByIDResponse_sync is a response to ProductionPlanningOrderByIDQuery_sync. The structure of the message type ProductionPlanningOrderByIDResponse_sync is specified by the message data type ProductionPlanningOrderByIDResponseMessage_sync.

For example, a "Production Planner/Production Scheduler" system 452002 can request to create a production planning order using the ProductionPlanningOrderCreateRequest_sync message 452006 as shown, for example, in FIG. 460. A "Supply and Demand Matching" system 452004 can confirm the creation request using the ProductionPlanningOrderCreateConfirmation_sync message 452008 as shown, for example, in FIG. 459. The "Production Planner/Production Scheduler" system 452002 can query production planning orders by elements (e.g., by basic data) using the ProductionPlanningOrderSimpleByBasicDataQuery_sync message 452010 as shown, for example, in FIG. 461. The "Supply and Demand Matching" system 452004 can respond to the query using the ProductionPlanningOrderSimpleByBasicDataResponse_sync message 452012 as shown, for example, in FIG. 462. The "Production Planner/Production Scheduler" system 452002 can query production planning orders by ID using the ProductionPlanningOrderByBasicDataQuery_sync message 452014 as shown, for example, in FIG. 453. The "Supply and Demand Matching" system 452004 can respond to the query using the ProductionPlanningOrderByBasicDataResponse__sync message 452016 as shown, for example, in FIG. 454. The "Production Planner/Production Scheduler" system 452002 can request to change a production planning order using the ProductionPlanningOrderChangeRequest_sync message 452018 as shown, for example, in FIG. 458. The "Supply and Demand Matching" system 452004 can confirm the change request using the ProductionPlanningOrderChangeConfirmation_sync message 452020 as shown, for example, in FIG. 457. The "Production Planner/Production Scheduler" system 452002 can request to cancel a production planning order using the ProductionPlanningOrderCancelRequest_sync message 452022 as shown, for example, in FIG. 456. The "Supply and Demand Matching" system 452004 can confirm the cancellation request using the ProductionPlanningOrderCancelConfirmation_sync message 452024 as shown, for example, in FIG. 455.

Message Data Type

The message data type ProductionPlanningOrderCreateRequestMessage_sync contains the ProductionPlanningOrderCreateRequest included in the business document and the business information that is relevant for sending a business document in a message. It contains the MessageHeader and ProductionPlanningOrder packages. FIGS. 464-1 through 464-6 show a ProductionPlanningOrderChangeRequestMessage_sync 464000 package. The ProductionPlanningOrderChangeRequestMessage_sync 464000 package is a ProductionPlanningOrderChangeRequestMessage_sync 464004 datatype. The ProductionPlanningOrderChangeRequestMessage_sync 464000 package includes a ProductionPlanningOrderChangeRequestMessage_sync 464002 entity. The ProductionPlanningOrderChangeRequestMessage_sync 464000 package includes various packages, namely MessageHeader 464006 and ProductionPlanningOrder 464014.

The MessageHeader 464006 package is a BasicBusinessDocumentMessageHeader 464012 datatype. The MessageHeader 464006 package includes a MessageHeader 464008 entity.

The MessageHeader 464008 entity has a cardinality of one 464010 meaning that for each instance of the ProductionPlanningOrderChangeRequestMessage_sync 464002 entity there is one MessageHeader 464008 entity.

The ProductionPlanningOrder 464014 package includes a ProductionPlanningOrder 464016 entity. The ProductionPlanningOrder 464014 package includes a Component 464038 package.

The ProductionPlanningOrder 464016 entity has a cardinality of zero or one 464018 meaning that for each instance of the ProductionPlanningOrderChangeRequestMessage_sync 464002 entity there may be one ProductionPlanningOrder 464016 entity. The ProductionPlanningOrder 464016 entity includes various attributes, namely ID 464020, ProductionModelID 464026 and ConversionAllowedIndicator 464032.

The ID 464020 attribute is a BusinessTransactionDocumentID 464024 datatype. The ID 464020 attribute has a cardinality of one 464022 meaning that for each instance of the ProductionPlanningOrder 464016 entity there is one ID 464020 attribute.

The ProductionModelID 464026 attribute is a ProductionModelID 464030 datatype. The ProductionModelID 464026 attribute has a cardinality of zero or one 464028 meaning that for each instance of the ProductionPlanningOrder 464016 entity there may be one ProductionModelID 464026 attribute.

The ConversionAllowedIndicator 464032 attribute is a ConversionAllowedIndicator 464036 datatype. The ConversionAllowedIndicator 464032 attribute has a cardinality of zero or one 464034 meaning that for each instance of the ProductionPlanningOrder 464016 entity there may be one ConversionAllowedIndicator 464032 attribute.

The Component 464038 package includes various entities, namely MaterialOutput 464040 and MaterialInput 4640108.

The MaterialOutput 464040 entity has a cardinality of one or n 464042 meaning that for each instance of the ProductionPlanningOrder 464016 entity there are one or more MaterialOutput 464040 entities. The MaterialOutput 464040 entity includes various attributes, namely ProductInternalID 464044, ProductionDateTime 464050, AvailabilityDateTime 464056, PlannedQuantity 464062, PlannedQuantityTypeCode 464068, PriorityValue 464074 and FixedIndicator 464080. The MaterialOutput 464040 entity includes a PropertyValuation 464086 subordinate entity.

The ProductInternalID 464044 attribute is a ProductInternalID 464048 datatype. The ProductInternalID 464044 attribute has a cardinality of one 464046 meaning that for each instance of the MaterialOutput 464040 entity there is one ProductInternalID 464044 attribute.

The ProductionDateTime 464050 attribute is a ProductionLOCALNORMALISED_DateTime 464054 datatype. The ProductionDateTime 464050 attribute has a cardinality of zero or one 464052 meaning that for each instance of the MaterialOutput 464040 entity there may be one ProductionDateTime 464050 attribute.

The AvailabilityDateTime 464056 attribute is an AvailabilityLOCALNORMALISED_DateTime 464060 datatype. The AvailabilityDateTime 464056 attribute has a cardinality of one 464058 meaning that for each instance of the MaterialOutput 464040 entity there is one AvailabilityDateTime 464056 attribute.

The PlannedQuantity 464062 attribute is a LARGE_Quantity 464066 datatype. The PlannedQuantity 464062 attribute has a cardinality of one 464064 meaning that for each instance of the MaterialOutput 464040 entity there is one PlannedQuantity 464062 attribute.

The PlannedQuantityTypeCode 464068 attribute is a QuantityTypeCode 464072 datatype. The PlannedQuantityTypeCode 464068 attribute has a cardinality of zero or one 464070 meaning that for each instance of the MaterialOutput 464040 entity there may be one PlannedQuantityTypeCode 464068 attribute.

The PriorityValue 464074 attribute is a PriorityValue 464078 datatype. The PriorityValue 464074 attribute has a cardinality of one 464076 meaning that for each instance of the MaterialOutput 464040 entity there is one PriorityValue 464074 attribute.

The FixedIndicator 464080 attribute is a FixedIndicator 464084 datatype. The FixedIndicator 464080 attribute has a cardinality of one 464082 meaning that for each instance of the MaterialOutput 464040 entity there is one FixedIndicator 464080 attribute.

The PropertyValuation 464086 entity has a cardinality of zero or n 464088 meaning that for each instance of the MaterialOutput 464040 entity there may be one or more PropertyValuation 464086 entities. The PropertyValuation 464086 entity includes various attributes, namely PropertyID 464090, PropertyValue 464096 and PropertyName 4640102.

The PropertyID 464090 attribute is a PropertyID 464094 datatype. The PropertyID 464090 attribute has a cardinality of one 464092 meaning that for each instance of the PropertyValuation 464086 entity there is one PropertyID 464090 attribute.

The PropertyValue 464096 attribute is a PropertyValue 4640100 datatype. The PropertyValue 464096 attribute has a cardinality of one 464098 meaning that for each instance of the PropertyValuation 464086 entity there is one PropertyValue 464096 attribute.

The PropertyName 4640102 attribute is a PropertyValueMEDIUM_Name 4640106 datatype. The PropertyName 4640102 attribute has a cardinality of zero or one 4640104 meaning that for each instance of the PropertyValuation 464086 entity there may be one PropertyName 4640102 attribute.

The MaterialInput 4640108 entity has a cardinality of zero or n 4640110 meaning that for each instance of the ProductionPlanningOrder 464016 entity there may be one or more MaterialInput 4640108 entities. The MaterialInput 4640108 entity includes various attributes, namely ItemID 4640112, ProductInternalID 4640118, DueDateTime 4640124, PlannedQuantity 4640130 and PlannedQuantityTypeCode 4640136. The MaterialInput 4640108 entity includes a PropertyValuation 4640142 subordinate entity.

The ItemID 4640112 attribute is a BusinessTransactionDocumentID 4640116 datatype. The ItemID 4640112 attribute has a cardinality of one 4640114 meaning that for each instance of the MaterialInput 4640108 entity there is one ItemID 4640112 attribute.

The ProductInternalID 4640118 attribute is a ProductInternalID 4640122 datatype. The ProductInternalID 4640118 attribute has a cardinality of one 4640120 meaning that for each instance of the MaterialInput 4640108 entity there is one ProductInternalID 4640118 attribute.

The DueDateTime 4640124 attribute is a DueLOCAL-NORMALISED_DateTime 4640128 datatype. The DueDateTime 4640124 attribute has a cardinality of zero or one 4640126 meaning that for each instance of the MaterialInput 4640108 entity there may be one DueDateTime 4640124 attribute.

The PlannedQuantity 4640130 attribute is a PlannedLARGE_Quantity 4640134 datatype. The PlannedQuantity 4640130 attribute has a cardinality of one 4640132 meaning that for each instance of the MaterialInput 4640108 entity there is one PlannedQuantity 4640130 attribute.

The PlannedQuantityTypeCode 4640136 attribute is a PlannedQuantityTypeCode 4640140 datatype. The PlannedQuantityTypeCode 4640136 attribute has a cardinality of zero or one 4640138 meaning that for each instance of the MaterialInput 4640108 entity there may be one PlannedQuantityTypeCode 4640136 attribute.

The PropertyValuation 4640142 entity has a cardinality of zero or n 4640144 meaning that for each instance of the MaterialInput 4640108 entity there may be one or more PropertyValuation 4640142 entities. The PropertyValuation 4640142 entity includes various attributes, namely PropertyID 4640146, PropertyValue 4640152 and PropertyValueName 4640158.

The PropertyID 4640146 attribute is a PropertyID 4640150 datatype. The PropertyID 4640146 attribute has a cardinality of one 4640148 meaning that for each instance of the PropertyValuation 4640142 entity there is one PropertyID 4640146 attribute.

The PropertyValue 4640152 attribute is a PropertyValue 4640156 datatype. The PropertyValue 4640152 attribute has a cardinality of one 4640154 meaning that for each instance of the PropertyValuation 4640142 entity there is one PropertyValue 4640152 attribute.

The PropertyValueName 4640158 attribute is a PropertyValueMEDIUM_Name 4640162 datatype. The PropertyValueName 4640158 attribute has a cardinality of zero or one 4640160 meaning that for each instance of the PropertyValuation 4640142 entity there may be one PropertyValueName 4640158 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder package groups the information relevant to describe a ProductionPlanningOrder. It contains the ProductionPlanningOrder entity. It contains the Component package.

ProductionPlanningOrder

Within the material requirements planning a ProductionPlanningOrder is a request to initiate the in-house production of a particular quantity of a material on a defined date. ID is an identifier for a production planning order. PlanningVersionID is a unique identifier for a Planning Version containing all necessary master and transaction data for planning. SupplyPlanningAreaID is a unique identifier of a SupplyPlanningArea for which the ProductionPlanningOrder is planned. LogisticsPlanningDetailLevelCode specifies the level of detail of planning.

Component Package

The Component package contains the MaterialOutput and PropertyValuation entities.

MaterialOutput

A MaterialOutput represents a material which is planned to be produced. ProductInternalID is a proprietary identifier for the MaterialOutput. SupplyPlanningAreaID is a unique identifier of a SupplyPlanningArea for which a stock receipt is planned via the production of the MaterialOutput. ProductionDateTime is a date/time on which production of the material output is planned to take place. AvailabilityDateTime is a date/time on which the material output should be available. PlannedQuantity is a planned quantity of the material output. PlannedQuantityTypeCode is a coded representation of the type of the planned quantity of the material output.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

Message Data Type

The message data type ProductionPlanningOrderCreateConfirmationMessage_sync contains the ProductionPlanningOrderCreateConfirmation included in the business document and the business information that is relevant for sending a business document in a message. It contains MessageHeader, ProductionPlanningOrder and Log packages. FIG. 469 shows a ProductionPlanningOrderCreateConfirmationMessage_sync 469000 package. The ProductionPlanningOrderCreateConfirmationMessage_sync 469000 package is a ProductionPlanningOrderCreateConfirmationMessage_sync 469004 datatype. The ProductionPlanningOrderCreateConfirmationMessage_sync 469000 package includes a ProductionPlanningOrderCreateConfirmationMessage_sync 469002 entity. The ProductionPlanningOrderCreateConfirmationMessage_sync 469000 package includes various packages, namely MessageHeader 469006, ProductionPlanningOrder 469014 and Log 469026.

The MessageHeader 469006 package is a BasicBusinessDocumentMessageHeader 469012 datatype. The MessageHeader 469006 package includes a MessageHeader 469008 entity.

The MessageHeader 469008 entity has a cardinality of one 469010 meaning that for each instance of the ProductionPlanningOrderCreateConfirmationMessage_sync 469002 entity there is one MessageHeader 469008 entity.

The ProductionPlanningOrder 469014 package includes a ProductionPlanningOrder 469016 entity.

The ProductionPlanningOrder 469016 entity has a cardinality of zero or one 469018 meaning that for each instance of the ProductionPlanningOrderCreateConfirmationMessage_sync 469002 entity there may be one ProductionPlanningOrder 469016 entity. The ProductionPlanningOrder 469016 entity includes an ID 469020 attribute.

The ID 469020 attribute is a BusinessTransactionDocumentID 469024 datatype. The ID 469020 attribute has a cardinality of one 469022 meaning that for each instance of the ProductionPlanningOrder 469016 entity there is one ID 469020 attribute.

The Log 469026 package is a Log 469032 datatype. The Log 469026 package includes a Log 469028 entity.

The Log 469028 entity has a cardinality of one 469030 meaning that for each instance of the ProductionPlanningOrderCreateConfirmationMessage_sync 469002 entity there is one Log 469028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder

The ProductionPlanningOrder contains the following element. ID is an identifier for a production planning order.

Log Package

Log

A log is a sequence of messages that may result from the execution of an application task.

Message Data Type

The message data type ProductionPlanningOrderChangeRequestMessage_sync contains the ProductionPlanningOrderChangeRequest included in the business document and the business information that is relevant for sending a business document in a message. It contains the MessageHeader and ProductionPlanningOrder packages. FIGS. 470-1 through 470-4 show a ProductionPlanningOrderCreateRequestMessage_sync 470000 package. The ProductionPlanningOrderCreateRequestMessage_sync 470000 package is a ProductionPlanningOrderCreateRequestMessage_sync 470004 datatype. The ProductionPlanningOrderCreateRequestMessage_sync 470000 package includes a ProductionPlanningOrderCreateRequestMessage_sync 470002 entity. The ProductionPlanningOrderCreateRequestMessage_sync 470000 package includes various packages, namely MessageHeader 470006 and ProductionPlanningOrder 470014.

The MessageHeader 470006 package is a BasicBusinessDocumentMessageHeader 470012 datatype. The MessageHeader 470006 package includes a MessageHeader 470008 entity.

The MessageHeader 470008 entity has a cardinality of one 470010 meaning that for each instance of the ProductionPlanningOrderCreateRequestMessage_sync 470002 entity there is one MessageHeader 470008 entity.

The ProductionPlanningOrder 470014 package includes a ProductionPlanningOrder 470016 entity. The ProductionPlanningOrder 470014 package includes a Component 470044 package.

The ProductionPlanningOrder 470016 entity has a cardinality of one 470018 meaning that for each instance of the ProductionPlanningOrderCreateRequestMessage_sync 470002 entity there is one ProductionPlanningOrder 470016 entity. The ProductionPlanningOrder 470016 entity includes various attributes, namely ID 470020, PlanningVersionID 470026, SupplyPlanningAreaID 470032 and LogisticsPlanningDetailLevelCode 470038.

The ID 470020 attribute is a BusinessTransactionDocumentID 470024 datatype. The ID 470020 attribute has a cardinality of zero or one 470022 meaning that for each instance of the ProductionPlanningOrder 470016 entity there may be one ID 470020 attribute.

The PlanningVersionID 470026 attribute is a PlanningVersionID 470030 datatype. The PlanningVersionID 470026 attribute has a cardinality of one 470028 meaning that for each instance of the ProductionPlanningOrder 470016 entity there is one PlanningVersionID 470026 attribute.

The SupplyPlanningAreaID 470032 attribute is a SupplyPlanningAreaID 470036 datatype. The SupplyPlanningAreaID 470032 attribute has a cardinality of one 470034 meaning that for each instance of the ProductionPlanningOrder 470016 entity there is one SupplyPlanningAreaID 470032 attribute.

The LogisticsPlanningDetailLevelCode 470038 attribute is a LogisticsPlanningDetailLevelCode 470042 datatype. The LogisticsPlanningDetailLevelCode 470038 attribute has a cardinality of zero or one 470040 meaning that for each instance of the ProductionPlanningOrder 470016 entity there may be one LogisticsPlanningDetailLevelCode 470038 attribute.

The Component 470044 package includes a MaterialOutput 470046 entity.

The MaterialOutput 470046 entity has a cardinality of one or n 470048 meaning that for each instance of the ProductionPlanningOrder 470016 entity there are one or more MaterialOutput 470046 entities. The MaterialOutput 470046 entity includes various attributes, namely ProductInternalID 470050, SupplyPlanningAreaID 470056, ProductionDateTime 470062, AvailabilityDateTime 470068, PlannedQuantity 470074 and PlannedQuantityTypeCode 470080. The MaterialOutput 470046 entity includes a PropertyValuation 470086 subordinate entity.

The ProductInternalID 470050 attribute is a ProductInternalID 470054 datatype. The ProductInternalID 470050 attribute has a cardinality of one 470052 meaning that for each instance of the MaterialOutput 470046 entity there is one ProductInternalID 470050 attribute.

The SupplyPlanningAreaID 470056 attribute is a SupplyPlanningAreaID 470060 datatype. The SupplyPlanningAreaID 470056 attribute has a cardinality of one 470058 meaning that for each instance of the MaterialOutput 470046 entity there is one SupplyPlanningAreaID 470056 attribute.

The ProductionDateTime 470062 attribute is a ProductionLOCALNORMALISED_DateTime 470066 datatype. The ProductionDateTime 470062 attribute has a cardinality of zero or one 470064 meaning that for each instance of the MaterialOutput 470046 entity there may be one ProductionDateTime 470062 attribute.

The AvailabilityDateTime 470068 attribute is an AvailabilityLOCALNORMALISED_DateTime 470072 datatype. The AvailabilityDateTime 470068 attribute has a cardinality of one 470070 meaning that for each instance of the MaterialOutput 470046 entity there is one AvailabilityDateTime 470068 attribute.

The PlannedQuantity 470074 attribute is a LARGE_Quantity 470078 datatype. The PlannedQuantity 470074 attribute has a cardinality of one 470076 meaning that for each instance of the MaterialOutput 470046 entity there is one PlannedQuantity 470074 attribute.

The PlannedQuantityTypeCode 470080 attribute is a QuantityTypeCode 470084 datatype. The PlannedQuantityTypeCode 470080 attribute has a cardinality of zero or one 470082 meaning that for each instance of the MaterialOutput 470046 entity there may be one PlannedQuantityTypeCode 470080 attribute.

The PropertyValuation 470086 entity has a cardinality of zero or n 470088 meaning that for each instance of the MaterialOutput 470046 entity there may be one or more PropertyValuation 470086 entities. The PropertyValuation 470086 entity includes various attributes, namely PropertyID 470090, PropertyValue 470096 and PropertyName 4700102.

The PropertyID 470090 attribute is a PropertyID 470094 datatype. The PropertyID 470090 attribute has a cardinality of one 470092 meaning that for each instance of the PropertyValuation 470086 entity there is one PropertyID 470090 attribute.

The PropertyValue 470096 attribute is a PropertyValue 4700100 datatype. The PropertyValue 470096 attribute has a cardinality of one 470098 meaning that for each instance of the PropertyValuation 470086 entity there is one PropertyValue 470096 attribute.

The PropertyName 4700102 attribute is a PropertyValueMEDIUM_Name 4700106 datatype. The PropertyName 4700102 attribute has a cardinality of zero or one 4700104 meaning that for each instance of the PropertyValuation 470086 entity there may be one PropertyName 4700102 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

The ProductionPlanningOrder package groups the information relevant to describe a ProductionPlanningOrder. It contains the ProductionPlanningOrder entity. It contains the Component package.

ProductionPlanningOrder

Within the material requirements planning a ProductionPlanningOrder is a request to initiate the in-house production of a particular quantity of a material on a defined date. ID is an identifier for a production planning order. ProductionModelID is a unique identifier for a ProductionModel containing the production process for manufacturing the MaterialOutput. ConversionAllowedIndicator specifies that the ProductionPlanningOrder can be converted into ProductionOrder during the next planning run.

Component Package

Component package contains the MaterialOutput, PropertyValuation, MaterialInput, and PropertyValuation entities.

MaterialOutput

MaterialOutput represents a material which is planned to be produced. ProductInternalID is a proprietary identifier for the MaterialOutput. ProductInternalID is read-only. ProductionDateTime is a date/time on which production of the material output is planned to take place. AvailabilityDateTime is a date/time on which the material output should be available. PlannedQuantity is a planned quantity of the material output. PlannedQuantityTypeCode is a coded representation of the type of the planned quantity of the material output. PriorityValue is a representation of the priority of the MaterialOutput. FixedIndicator specifies whether the material output is fixed or not.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

MaterialInput

A MaterialInput represents a material which is needed for producing the output materials. ItemID is a position of a MaterialInput within the ProductionPlanningOrder. ProductInternalID is a proprietary Identifier for the MaterialInput. DueDateTime is a point in time at which the material input in due. PlannedQuantity is a planned quantity of the material input. PlannedQuantityTypeCode is a coded representation of the type of the planned quantity of the material input.

PropertyValuation

A PropertyValuation is the value of the property assigned to the MaterialInput. PropertyID is a unique identifier for a property. A property is an object attribute. PropertyValue describes a value that can be assigned to a property. The value can also be an interval. PropertyValueName describes the name of the PropertyValue.

Message Data Type

The message data type ProductionPlanningOrderChangeConfirmationMessage_sync contains the ProductionPlanningOrderChangeConfirmation included in the business document and the business information that is relevant for sending a business document in a message. It contains the MessageHeader, ProductionPlanningOrder and Log packages. FIG. 468 shows a ProductionPlanningOrderChangeConfirmationMessage_sync 468000 package. The ProductionPlanningOrderChangeConfirmationMessage_sync 468000 package is a ProductionPlanningOrderChangeConfirmationMessage_sync 468004 datatype. The ProductionPlanningOrderChangeConfirmationMessage_sync 468000 package includes a ProductionPlanningOrderCreateConfirmationMessage_sync 468002 entity. The ProductionPlanningOrderChangeConfirmationMessage_sync 468000 package includes various packages, namely MessageHeader 468006, ProductionPlanningOrder 468014 and Log 468026.

The MessageHeader 468006 package is a BasicBusinessDocumentMessageHeader 468012 datatype. The MessageHeader 468006 package includes a MessageHeader 468008 entity.

The MessageHeader 468008 entity has a cardinality of one 468010 meaning that for each instance of the ProductionPlanningOrderCreateConfirmationMessage_sync 468002 entity there is one MessageHeader 468008 entity.

The ProductionPlanningOrder 468014 package includes a ProductionPlanningOrder 468016 entity.

The ProductionPlanningOrder 468016 entity has a cardinality of zero or one 468018 meaning that for each instance of the ProductionPlanningOrderCreateConfirmationMessage_sync 468002 entity there may be one ProductionPlanningOrder 468016 entity. The ProductionPlanningOrder 468016 entity includes an ID 468020 attribute.

The ID 468020 attribute is a BusinessTransactionDocumentID 468024 datatype. The ID 468020 attribute has a cardinality of one 468022 meaning that for each instance of the ProductionPlanningOrder 468016 entity there is one ID 468020 attribute.

The Log 468026 package is a Log 468032 datatype. The Log 468026 package includes a Log 468028 entity.

The Log 468028 entity has a cardinality of one 468030 meaning that for each instance of the ProductionPlanningOrderCreateConfirmationMessage_sync 468002 entity there is one Log 468028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains an ID element, which is an identifier for a production planning order.

Log Package

A log is a sequence of messages that may result from the execution of an application task.

Message Data Type

The message data type ProductionPlanningOrderCancelRequestMessage_sync contains the ProductionPlanningOrderCancelRequest included in the business document and the business information that is relevant for sending a business document in a message. It contains the MessageHeader and ProductionPlanningOrder packages. FIG. 467 shows a ProductionPlanningOrderCancelRequestMessage_sync 467000 package. The ProductionPlanningOrderCancelRequestMessage_sync 467000 package is a ProductionPlanningOrderCancelRequestMessage_sync 467004 datatype. The ProductionPlanningOrderCancelRequestMessage_sync 467000 package includes a ProductionPlanningOrderCancelRequestMessage_sync 467002 entity. The ProductionPlanningOrderCancelRequestMessage_sync 467000 package includes various packages, namely MessageHeader 467006 and ProductionPlanningOrder 467014.

The MessageHeader 467006 package is a BasicBusinessDocumentMessageHeader 467012 datatype. The MessageHeader 467006 package includes a MessageHeader 467008 entity.

The MessageHeader 467008 entity has a cardinality of one 467010 meaning that for each instance of the ProductionPlanningOrderCancelRequestMessage_sync 467002 entity there is one MessageHeader 467008 entity.

The ProductionPlanningOrder 467014 package includes a ProductionPlanningOrder 467016 entity.

The ProductionPlanningOrder 467016 entity has a cardinality of one 467018 meaning that for each instance of the ProductionPlanningOrderCancelRequestMessage_sync 467002 entity there is one ProductionPlanningOrder 467016 entity. The ProductionPlanningOrder 467016 entity includes an ID 467020 attribute.

The ID 467020 attribute is a BusinessTransactionDocumentID 467024 datatype. The ID 467020 attribute has a cardinality of one 467022 meaning that for each instance of the ProductionPlanningOrder 467016 entity there is one ID 467020 attribute.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains an ID element, which is an identifier for a production planning order.

Message Data Type

The message data type ProductionPlanningOrderCancelConfirmationMessage_sync contains the ProductionPlanningOrderCancelConfirmation included in the business document and the business information that is relevant for sending a business document in a message. It contains the MessageHeader, ProductionPlanningOrder and Log packages. FIG. 466 shows a ProductionPlanningOrderCancelConfirmationMessage_sync 466000 package. The ProductionPlanningOrderCancelConfirmationMessage_sync 466000 package is a ProductionPlanningOrderCancelConfirmationMessage_sync 466004 datatype. The ProductionPlanningOrderCancelConfirmationMessage_sync 466000 package includes a ProductionPlanningOrderCancelConfirmationMessage_sync 466002 entity. The ProductionPlanningOrderCancelConfirmationMessage_sync 466000 package includes various packages, namely MessageHeader 466006, ProductionPlanningOrder 466014 and Log 466026.

The MessageHeader 466006 package is a BasicBusinessDocumentMessageHeader 466012 datatype. The MessageHeader 466006 package includes a MessageHeader 466008 entity.

The MessageHeader 466008 entity has a cardinality of one 466010 meaning that for each instance of the ProductionPlanningOrderCancelConfirmationMessage_sync 466002 entity there is one MessageHeader 466008 entity.

The ProductionPlanningOrder 466014 package includes a ProductionPlanningOrder 466016 entity.

The ProductionPlanningOrder 466016 entity has a cardinality of zero or one 466018 meaning that for each instance of the ProductionPlanningOrderCancelConfirmationMessage_sync 466002 entity there may be one ProductionPlanningOrder 466016 entity. The ProductionPlanningOrder 466016 entity includes an ID 466020 attribute.

The ID 466020 attribute is a BusinessTransactionDocumentID 466024 datatype. The ID 466020 attribute has a cardinality of one 466022 meaning that for each instance of the ProductionPlanningOrder 466016 entity there is one ID 466020 attribute.

The Log 466026 package is a Log 466032 datatype. The Log 466026 package includes a Log 466028 entity.

The Log 466028 entity has a cardinality of one 466030 meaning that for each instance of the ProductionPlanningOrderCancelConfirmationMessage_sync 466002 entity there is one Log 466028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element.

ProductionPlanningOrder Package

ProductionPlanningOrder

The ProductionPlanningOrder contains the ID element, which is an identifier for a production planning order.

Log Package

A log is a sequence of messages that may result from the execution of an application task.

Message Data Type

The message data type ProductionPlanningOrderSimpleByElementsQueryMessage_sync contains the ProductionPlanningOrderSimpleByElementsQuery included in the business document and the business information that is relevant for sending a business document in a message. It contains the Selection package. FIGS. 471-1 through 471-6 show a ProductionPlanningOrderSimpleByElementsQueryMessage_sync 471000 package. The ProductionPlanningOrderSimpleByElementsQueryMessage_sync 471000 package is a ProductionPlanningOrderSimpleByElementsQueryMessage_sync 471004 datatype. The ProductionPlanningOrderSimpleByElementsQueryMessage_sync 471000 package includes a ProductionPlanningOrderSimpleByElementsQueryMessage_sync 471002 entity. The ProductionPlanningOrderSimpleByElementsQueryMessage_sync 471000 package includes a Selection 471006 package.

The Selection 471006 package includes a ProductionPlanningOrderSelectionSimpleByElements 471008 entity.

The ProductionPlanningOrderSelectionSimpleByElements 471008 entity has a cardinality of one 471010 meaning that for each instance of the ProductionPlanningOrderSimpleByElementsQueryMessage_sync 471002 entity there is one ProductionPlanningOrderSelectionSimpleByElements 471008 entity. The ProductionPlanningOrderSelectionSimpleByElements 471008 entity includes a PlanningVersionID 471012 attribute. The ProductionPlanningOrderSelectionSimpleByElements 471008 entity has various subordinate entities, namely SelectionByProductionPlanningOrderTypeCode 471018, SelectionBySupplyPlanningAreaID 471046, SelectionByProductInternalID 471074, SelectionByResourceID 4710102 and SelectionByAvailabilityDateTime 4710130.

The PlanningVersionID 471012 attribute is a PlanningVersionID 471016 datatype. The PlanningVersionID 471012 attribute has a cardinality of one 471014 meaning that for each instance of the ProductionPlanningOrderSelectionSimpleByElements 471008 entity there is one PlanningVersionID 471012 attribute.

The SelectionByProductionPlanningOrderTypeCode 471018 entity has a cardinality of one 471020 meaning that for each instance of the ProductionPlanningOrderSelectionSimpleByElements 471008 entity there is one SelectionByProductionPlanningOrderTypeCode 471018 entity. The SelectionByProductionPlanningOrderTypeCode 471018 entity includes various attributes, namely InclusionExclusionCode 471022, IntervalBoundaryTypeCode 471028, LowerBoundaryProductionPlanningOrderTypeCode 471034 and UpperBoundaryProductionPlanningOrderTypeCode 471040.

The InclusionExclusionCode 471022 attribute is an InclusionExclusionCode 471026 datatype. The InclusionExclusionCode 471022 attribute has a cardinality of one 471024 meaning that for each instance of the SelectionByProductionPlanningOrderTypeCode 471018 entity there is one InclusionExclusionCode 471022 attribute.

The IntervalBoundaryTypeCode 471028 attribute is an IntervalBoundaryTypeCode 471032 datatype. The IntervalBoundaryTypeCode 471028 attribute has a cardinality of one 471030 meaning that for each instance of the SelectionByProductionPlanningOrderTypeCode 471018 entity there is one IntervalBoundaryTypeCode 471028 attribute.

The LowerBoundaryProductionPlanningOrderTypeCode 471034 attribute is a BusinessTransactionDocumentTypeCode 471038 datatype. The LowerBoundaryProductionPlanningOrderTypeCode 471034 attribute has a cardinality of one 471036 meaning that for each instance of the SelectionByProductionPlanningOrderTypeCode 471018 entity there is one LowerBoundaryProductionPlanningOrderTypeCode 471034 attribute.

The UpperBoundaryProductionPlanningOrderTypeCode 471040 attribute is a BusinessTransactionDocumentTypeCode 471044 datatype. The UpperBoundaryProductionPlanningOrderTypeCode 471040 attribute has a cardinality of zero or one 471042 meaning that for each instance of the SelectionByProductionPlanningOrderTypeCode 471018 entity there may be one UpperBoundaryProductionPlanningOrderTypeCode 471040 attribute.

The SelectionBySupplyPlanningAreaID 471046 entity has a cardinality of zero or one 471048 meaning that for each instance of the ProductionPlanningOrderSelectionSimpleByElements 471008 entity there may be one SelectionBySupplyPlanningAreaID 471046 entity. The SelectionBySupplyPlanningAreaID 471046 entity includes various attributes, namely InclusionExclusionCode 471050, IntervalBoundaryTypeCode 471056, LowerBoundarySupplyPlanningAreaID 471062 and UpperBoundarySupplyPlanningAreaID 471068.

The InclusionExclusionCode 471050 attribute is an InclusionExclusionCode 471054 datatype. The InclusionExclusionCode 471050 attribute has a cardinality of one 471052 meaning that for each instance of the SelectionBySupplyPlanningAreaID 471046 entity there is one InclusionExclusionCode 471050 attribute.

The IntervalBoundaryTypeCode 471056 attribute is an IntervalBoundaryTypeCode 471060 datatype. The IntervalBoundaryTypeCode 471056 attribute has a cardinality of one 471058 meaning that for each instance of the SelectionBySupplyPlanningAreaID 471046 entity there is one IntervalBoundaryTypeCode 471056 attribute.

The LowerBoundarySupplyPlanningAreaID 471062 attribute is a SupplyPlanningAreaID 471066 datatype. The LowerBoundarySupplyPlanningAreaID 471062 attribute has a cardinality of one 471064 meaning that for each instance of the SelectionBySupplyPlanningAreaID 471046 entity there is one LowerBoundarySupplyPlanningAreaID 471062 attribute.

The UpperBoundarySupplyPlanningAreaID 471068 attribute is a SupplyPlanningAreaID 471072 datatype. The UpperBoundarySupplyPlanningAreaID 471068 attribute has a cardinality of zero or one 471070 meaning that for each instance of the SelectionBySupplyPlanningAreaID 471046 entity there may be one UpperBoundarySupplyPlanningAreaID 471068 attribute.

The SelectionByProductInternalID 471074 entity has a cardinality of zero or one 471076 meaning that for each instance of the ProductionPlanningOrderSelectionSimpleByElements 471008 entity there may be one SelectionByProductInternalID 471074 entity. The SelectionByProductInternalID 471074 entity includes various attributes, namely InclusionExclusionCode 471078, Interval- BoundaryTypeCode 471084, LowerBoundaryProductInternalID 471090 and UpperBoundaryProductInternalID 471096.

The InclusionExclusionCode 471078 attribute is an InclusionExclusionCode 471082 datatype. The InclusionExclusionCode 471078 attribute has a cardinality of one 471080 meaning that for each instance of the SelectionByProductInternalID 471074 entity there is one InclusionExclusionCode 471078 attribute.

The IntervalBoundaryTypeCode 471084 attribute is an IntervalBoundaryTypeCode 471088 datatype. The IntervalBoundaryTypeCode 471084 attribute has a cardinality of one 471086 meaning that for each instance of the SelectionByProductInternalID 471074 entity there is one IntervalBoundaryTypeCode 471084 attribute.

The LowerBoundaryProductInternalID 471090 attribute is a ProductInternalID 471094 datatype. The LowerBoundaryProductInternalID 471090 attribute has a cardinality of one 471092 meaning that for each instance of the SelectionByProductInternalID 471074 entity there is one LowerBoundaryProductInternalID 471090 attribute.

The UpperBoundaryProductInternalID 471096 attribute is a ProductInternalID 4710100 datatype. The UpperBoundaryProductInternalID 471096 attribute has a cardinality of zero or one 471098 meaning that for each instance of the SelectionByProductInternalID 471074 entity there may be one UpperBoundaryProductInternalID 471096 attribute.

The SelectionByResourceID 4710102 entity has a cardinality of zero or one 4710104 meaning that for each instance of the ProductionPlanningOrderSelectionSimpleByElements 471008 entity there may be one SelectionByResourceID 4710102 entity. The SelectionByResourceID 4710102 entity includes various attributes, namely InclusionExclusionCode 4710106, IntervalBoundaryTypeCode 4710112, LowerBoundaryResourceID 4710118 and UpperBoundaryResourceID 4710124.

The InclusionExclusionCode 4710106 attribute is an InclusionExclusionCode 4710110 datatype. The InclusionExclusionCode 4710106 attribute has a cardinality of one 4710108 meaning that for each instance of the SelectionByResourceID 4710102 entity there is one InclusionExclusionCode 4710106 attribute.

The IntervalBoundaryTypeCode 4710112 attribute is an IntervalBoundaryTypeCode 4710116 datatype. The IntervalBoundaryTypeCode 4710112 attribute has a cardinality of one 4710114 meaning that for each instance of the SelectionByResourceID 4710102 entity there is one IntervalBoundaryTypeCode 4710112 attribute.

The LowerBoundaryResourceID 4710118 attribute is a ResourceID 4710122 datatype. The LowerBoundaryResourceID 4710118 attribute has a cardinality of one 4710120 meaning that for each instance of the SelectionByResourceID 4710102 entity there is one LowerBoundaryResourceID 4710118 attribute.

The UpperBoundaryResourceID 4710124 attribute is a ResourceID 4710128 datatype. The UpperBoundaryResourceID 4710124 attribute has a cardinality of zero or one 4710126 meaning that for each instance of the SelectionByResourceID 4710102 entity there may be one UpperBoundaryResourceID 4710124 attribute.

The SelectionByAvailabilityDateTime 4710130 entity has a cardinality of zero or one 4710132 meaning that for each instance of the ProductionPlanningOrderSelectionSimpleByElements 471008 entity there may be one SelectionByAvailabilityDateTime 4710130 entity. The SelectionByAvailabilityDateTime 4710130 entity includes various attributes, namely InclusionExclusionCode 4710134, IntervalBoundaryTypeCode 4710140, LowerBoundaryAvailabilityDateTime 4710146 and UpperBoundaryAvailabilityDateTime 4710152.

The InclusionExclusionCode 4710134 attribute is an InclusionExclusionCode 4710138 datatype. The InclusionExclusionCode 4710134 attribute has a cardinality of one 4710136 meaning that for each instance of the SelectionByAvailabilityDateTime 4710130 entity there is one InclusionExclusionCode 4710134 attribute.

The IntervalBoundaryTypeCode 4710140 attribute is an IntervalBoundaryTypeCode 4710144 datatype. The IntervalBoundaryTypeCode 4710140 attribute has a cardinality of one 4710142 meaning that for each instance of the SelectionByAvailabilityDateTime 4710130 entity there is one IntervalBoundaryTypeCode 4740140 attribute.

The LowerBoundaryAvailabilityDateTime 4710146 attribute is an AvailabilityLOCALNORMALISED_DateTime 4710150 datatype. The LowerBoundaryAvailabilityDateTime 4710146 attribute has a cardinality of one 4710148 meaning that for each instance of the SelectionByAvailabilityDateTime 4710130 entity there is one LowerBoundaryAvailabilityDateTime 4710146 attribute.

The UpperBoundaryAvailabilityDateTime 4710152 attribute is an AvailabilityLOCALNORMALISED_DateTime 4710156 datatype. The UpperBoundaryAvailabilityDateTime 4710152 attribute has a cardinality of one 4710154 meaning that for each instance of the SelectionByAvailabilityDateTime 4710130 entity there is one UpperBoundaryAvailabilityDateTime 4710152 attribute.

Selection Package

ProductionPlanningOrderSelectionSimpleByElements

The ProductionPlanningOrderSelectionSimpleByElements specifies selection criteria to be used to select ProductionPlanningOrders. PlanningVersionID is a unique identifier for a planning version containing all master and transaction data necessary for planning. SelectionByProductionPlanningOrderTypeCode is a range of ProductionPlanningOrderTypeCode identifiers. InclusionExclusionCode is a coded representation of the inclusion of a set into a result set or the exclusion of it. IntervalBoundaryTypeCode is a coded representation of an interval boundary type. LowerBoundaryProductionPlanningOrderTypeCode is the lower boundary of the ProductionPlanningOrderTypeCode UpperBoundaryProductionPlanningOrderTypeCode is the upper boundary of the ProductionPlanningOrderTypeCode. SelectionBySupplyPlanningAreaID is a range of SupplyPlanningAreaID identifiers. LowerBoundarySupplyPlanningAreaID is a unique identifier for a SupplyPlanningArea. The LowerBoundarySupplyPlanningAreaID is the lower boundary of the SupplyPlanningAreaID identifier interval. UpperBoundarySupplyPlanningAreaID is a unique identifier for a SupplyPlanningArea. The UpperBoundarySupplyPlanningAreaID is the upper boundary of the SupplyPlanningAreaID identifier interval. SelectionByProductInternalID is a range of proprietary identifiers for Product. LowerBoundaryProductInternalID is a proprietary identifier for a Product. The LowerBoundaryProductInternalID is the lower boundary of the ProductInternalID identifier interval. UpperBoundaryProductInternalID is a Proprietary identifier for a Product. The UpperBoundaryProductInternalID is the upper boundary of the ProductInternalID identifier interval. SelectionByResourceID is a range of ResourceID identifiers. LowerBoundaryResourceID is a unique identifier for a resource on which capacity requirement for a production planning order is dispatched. The LowerBoundaryResourceID is the lower boundary of the ResourceID identifier interval. UpperBoundaryResourceID is a unique identifier for a resource on which capacity requirement for a ProductionPlanningOrder is dispatched. The UpperBoundaryResourceID is the upper boundary of the ResourceID identifier interval. SelectionByAvailabilityDateTime is a range of AvailabilityDateTime identifiers. LowerBoundaryAvailabilityDateTime is a date/time on which the material output should be available. The LowerBoundaryAvailabilityDateTime is the lower boundary of the AvailabilityDateTime interval. UpperBoundaryAvailabilityDateTime is a date/time on which the material output should be available. The UpperBoundaryAvailabilityDateTime is the upper boundary of the AvailabilityDateTime interval.

Message Data Type

The message data type ProductionPlanningOrderSimpleByElementsResponseMessage_sync contains the ProductionPlanningOrderSimpleByElementsResponse included in the business document and the business information that is relevant for sending a business document in a message. It contains the MessageHeader, ProductionPlanningOrder, and Log packages. FIG. 472 shows a ProductionPlanningOrderSimpleByElementsResponseMessage_sync 472000 package. The ProductionPlanningOrderSimpleByElementsResponseMessage_sync 472000 package is a ProductionPlanningOrderSimpleByElementsResponseMessage_sync 472004 datatype. The ProductionPlanningOrderSimpleByElementsResponseMessage_sync 472000 package includes a ProductionPlanningOrderSimpleByElementsResponseMessage_sync 472002 entity. The ProductionPlanningOrderSimpleByElementsResponseMessage_sync 472000 package includes various packages, namely MessageHeader 472006, ProductionPlanningOrder 472014 and Log 472026.

The MessageHeader 472006 package is a BasicBusinessDocumentMessageHeader 472012 datatype. The MessageHeader 472006 package includes a MessageHeader 472008 entity.

The MessageHeader 472008 entity has a cardinality of one 472010 meaning that for each instance of the ProductionPlanningOrderSimpleByElementsResponseMessage_sync 472002 entity there is one MessageHeader 472008 entity.

The ProductionPlanningOrder 472014 package includes a ProductionPlanningOrder 472016 entity.

The ProductionPlanningOrder 472016 entity has a cardinality of zero or n 472018 meaning that for each instance of the ProductionPlanningOrderSimpleByElementsResponseMessage_sync 472002 entity there may be one or more ProductionPlanningOrder 472016 entities. The ProductionPlanningOrder 472016 entity includes an ID 472020 attribute.

The ID 472020 attribute is a BusinessTransactionDocumentID 472024 datatype. The ID 472020 attribute has a cardinality of one 472022 meaning that for each instance of the ProductionPlanningOrder 472016 entity there is one ID 472020 attribute.

The Log 472026 package is a Log 472032 datatype. The Log 472026 package includes a Log 472028 entity.

The Log 472028 entity has a cardinality of one 472030 meaning that for each instance of the ProductionPlanningOrderSimpleByElementsResponseMessage_sync 472002 entity there is one Log 472028 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application. The MessageHeader contains the BasicBusinessDocumentMessageHeader element, which is of type GDT: BasicBusinessDocumentMessageHeader.

ProductionPlanningOrder Package

ProductionPlanningOrder

The ProductionPlanningOrder contains the ID element. The ID element is an identifier for a production planning order.

Log Package

A log is a sequence of messages that may result from the execution of an application task.

Message Data Type

The message data type ProductionPlanningOrderbyIDQueryMessage_sync contains the ProductionPlanningOrderByIDQuery included in the business document and the business information that is relevant for sending a business document in a message. It contains the Selection package. FIG. 465 shows a ProductionPlanningOrderByIDQueryMessage_sync 465000 package. The ProductionPlanningOrderByIDQueryMessage_sync 465000 package is a ProductionPlanningOrderByIDQueryMessage_sync 465004 datatype. The ProductionPlanningOrderByIDQueryMessage_sync 465000 package includes a ProductionPlanningOrderByIDQueryMessage_sync 465002 entity. The ProductionPlanningOrderByIDQueryMessage_sync 465000 package includes a Selection 465006 package.

The Selection 465006 package includes a ProductionPlanningOrderSelectionByID 465008 entity.

The ProductionPlanningOrderSelectionByID 465008 entity has a cardinality of one 465010 meaning that for each instance of the ProductionPlanningOrderByIDQueryMessage_sync 465002 entity there is one ProductionPlanningOrderSelectionByID 465008 entity. The ProductionPlanningOrderSelectionByID 465008 entity includes an ID 465012 attribute.

The ID 465012 attribute is a BusinessTransactionDocumentID 465016 datatype. The ID 465012 attribute has a cardinality of one 465014 meaning that for each instance of the ProductionPlanningOrderSelectionByID 465008 entity there is one ID 465012 attribute.

Selection Package

ProductionPlanningOrderSelectionByID

The ProductionPlanningOrderSelectionByID specifies the ID of the ProductionPlanningOrder to be queried. ProductionPlanningOrderSelectionByID is an identifier for production planning order. ID is an identifier for a production planning order.

Message Data Type

The message data type ProductionPlanningOrderByIDResponseMessage_sync contains the ProductionPlanningOrderByIDResponse included in the business document and the business information that is relevant for sending a business document in a message. It contains the MessageHeader, ProductionPlanningOrder, and Log packages. FIGS. 463-1 through 463-27 show a ProductionPlanningOrderByIDResponsetMessage_sync 463000 package. The ProductionPlanningOrderByIDResponsetMessage_sync 463000 package is a Production Planning OrderByIDResponseMessage_sync 463004 datatype. The ProductionPlanningOrderByIDResponsetMessage_sync 463000 package includes a ProductionPlanningOrderByIDResponseMessage_sync 463002 entity. The ProductionPlanningOrderByIDResponsetMessage_sync 463000 package includes various packages, namely MessageHeader 463006, ProductionPlanningOrder 463014 and Log 4630700.

The MessageHeader 463006 package is a BasicBusinessDocumentMessageHeader 463012 datatype. The MessageHeader 463006 package includes a MessageHeader 463008 entity.

The MessageHeader 463008 entity has a cardinality of one 463010 meaning that for each instance of the ProductionPlanningOrderByIDResponseMessage_sync 463002 entity there is one MessageHeader 463008 entity.

The ProductionPlanningOrder 463014 package includes a ProductionPlanningOrder 463016 entity. The ProductionPlanningOrder 463014 package includes various packages, namely Operation 4630116, CapacityRequirement 4630288 and Component 4630376.

The ProductionPlanningOrder 463016 entity has a cardinality of zero or one 463018 meaning that for each instance of the ProductionPlanningOrderByIDResponseMessage_sync 463002 entity there may be one ProductionPlanningOrder 463016 entity. The ProductionPlanningOrder 463016 entity includes various attributes, namely ID 463020, PlanningVersionID 463026, SupplyPlanningAreaID 463032, ProductionModelID 463038, SystemAdministrativeData 463044, SourceOfSupplyExplosionDate 463050, TypeCode 463056, LogisticsPlanningDetailLevelCode 463062, ValidityPeriod 463068, PlannedPeriod 463074, OpeningDateTime 463080, FixedIndicator 463086, SourceOfSupplyFixedIndicator 463092, ConversionAllowedIndicator 463098, MaterialSupplyAndDemandStatusCode 4630104 and LifeCycleStatusCode 4630110.

The ID 463020 attribute is a BusinessTransactionDocumentID 463024 datatype. The ID 463020 attribute has a cardinality of one 463022 meaning that for each instance of the ProductionPlanningOrder 463016 entity there is one ID 463020 attribute.

The PlanningVersionID 463026 attribute is a PlanningVersionID 463030 datatype. The PlanningVersionID 463026 attribute has a cardinality of one 463028 meaning that for each instance of the ProductionPlanningOrder 463016 entity there is one PlanningVersionID 463026 attribute.

The SupplyPlanningAreaID 463032 attribute is a SupplyPlanningAreaID 463036 datatype. The SupplyPlanningAreaID 463032 attribute has a cardinality of one 463034 meaning that for each instance of the ProductionPlanningOrder 463016 entity there is one SupplyPlanningAreaID 463032 attribute.

The ProductionModelID 463038 attribute is a ProductionModelID 463042 datatype. The ProductionModelID 463038 attribute has a cardinality of zero or one 463040 meaning that for each instance of the ProductionPlanningOrder 463016 entity there may be one ProductionModelID 463038 attribute.

The SystemAdministrativeData 463044 attribute is a SystemAdministrativeData 463048 datatype. The SystemAdministrativeData 463044 attribute has a cardinality of one 463046 meaning that for each instance of the ProductionPlanningOrder 463016 entity there is one SystemAdministrativeData 463044 attribute.

The SourceOfSupplyExplosionDate 463050 attribute is an ExplosionDate 463054 datatype. The SourceOfSupplyExplosionDate 463050 attribute has a cardinality of zero or one 463052 meaning that for each instance of the ProductionPlanningOrder 463016 entity there may be one SourceOfSupplyExplosionDate 463050 attribute.

The TypeCode 463056 attribute is a BusinessTransactionDocumentTypeCode 463060 datatype. The TypeCode 463056 attribute has a cardinality of one 463058 meaning that for each instance of the ProductionPlanningOrder 463016 entity there is one TypeCode 463056 attribute.

The LogisticsPlanningDetailLevelCode 463062 attribute is a LogisticsPlanningDetailLevelCode 463066 datatype. The LogisticsPlanningDetailLevelCode 463062 attribute has a cardinality of zero or one 463064 meaning that for each instance of the ProductionPlanningOrder 463016 entity there may be one LogisticsPlanningDetailLevelCode 463062 attribute.

The ValidityPeriod 463068 attribute is a ValidityUPPEROPEN_LOCALNORMALISED_DateTimePeriod 463072 datatype. The ValidityPeriod 463068 attribute has a cardinality of one 463070 meaning that for each instance of the ProductionPlanningOrder 463016 entity there is one ValidityPeriod 463068 attribute.

The PlannedPeriod 463074 attribute is a PlannedUPPEROPEN_LOCALNORMALISED_DateTimePeriod 463078 datatype. The PlannedPeriod 463074 attribute has a cardinality of one 463076 meaning that for each instance of the ProductionPlanningOrder 463016 entity there is one PlannedPeriod 463074 attribute.

The OpeningDateTime 463080 attribute is an OpeningLOCALNORMALSED_DateTime 463084 datatype. The OpeningDateTime 463080 attribute has a cardinality of one 463082 meaning that for each instance of the ProductionPlanningOrder 463016 entity there is one OpeningDateTime 463080 attribute.

The FixedIndicator 463086 attribute is a FixedIndicator 463090 datatype. The FixedIndicator 463086 attribute has a cardinality of zero or one 463088 meaning that for each instance of the ProductionPlanningOrder 463016 entity there may be one FixedIndicator 463086 attribute.

The SourceOfSupplyFixedIndicator 463092 attribute is a FixedIndicator 463096 datatype. The SourceOfSupplyFixedIndicator 463092 attribute has a cardinality of zero or one 463094 meaning that for each instance of the ProductionPlanningOrder 463016 entity there may be one SourceOfSupplyFixedIndicator 463092 attribute.

The ConversionAllowedIndicator 463098 attribute is an AllowedIndicator 4630102 datatype. The ConversionAllowedIndicator 463098 attribute has a cardinality of zero or one 4630100 meaning that for each instance of the ProductionPlanningOrder 463016 entity there may be one ConversionAllowedIndicator 463098 attribute.

The MaterialSupplyAndDemandStatusCode 4630104 attribute is a PRODUCTION_MaterialSupplyAndDemandStatusCode 4630108 datatype. The MaterialSupplyAndDemandStatusCode 4630104 attribute has a cardinality of one 4630106 meaning that for each instance of the ProductionPlanningOrder 463016 entity there is one MaterialSupplyAndDemandStatusCode 4630104 attribute.

The LifeCycleStatusCode 4630110 attribute is a ProductionPlanningOrderLifeCycleStatusCode 4630114 datatype. The LifeCycleStatusCode 4630110 attribute has a cardinality of zero or one 4630112 meaning that for each instance of the ProductionPlanningOrder 463016 entity there may be one LifeCycleStatusCode 4630110 attribute.

The Operation 4630116 package includes an Operation 4630118 entity.

The Operation 4630118 entity has a cardinality of one or n 4630120 meaning that for each instance of the ProductionPlanningOrder 463016 entity there are one or more Operation 4630118 entities. The Operation 4630118 entity includes various attributes, namely ID 4630122, Description 4630128, PlannedPeriod 4630134, PlannedDuration 4630140, FixedIndicator 4630146 and ProductionConfirmationRecord- TypeCode 4630152. The Operation 4630118 entity has various subordinate entities, namely Alternative 4630158 and Activity 4630192.

The ID 4630122 attribute is an OperationID 4630126 datatype. The ID 4630122 attribute has a cardinality of one 4630124 meaning that for each instance of the Operation 4630118 entity there is one ID 4630122 attribute.

The Description 4630128 attribute is an OperationMEDIUM_Description 4630132 datatype. The Description 4630128 attribute has a cardinality of zero or one 4630130 meaning that for each instance of the Operation 4630118 entity there may be one Description 4630128 attribute.

The PlannedPeriod 4630134 attribute is a PlannedUPPEROPEN_LOCALNORMALISED_DateTimePeriod 4630138 datatype. The PlannedPeriod 4630134 attribute has a cardinality of zero or one 4630136 meaning that for each instance of the Operation 4630118 entity there may be one PlannedPeriod 4630134 attribute.

The PlannedDuration 4630140 attribute is a PlannedTIME_Duration 4630144 datatype. The PlannedDuration 4630140 attribute has a cardinality of zero or one 4630142 meaning that for each instance of the Operation 4630118 entity there may be one PlannedDuration 4630140 attribute.

The FixedIndicator 4630146 attribute is a FixedIndicator 4630150 datatype. The FixedIndicator 4630146 attribute has a cardinality of zero or one 4630148 meaning that for each instance of the Operation 4630118 entity there may be one FixedIndicator 4630146 attribute.

The ProductionConfirmationRecordTypeCode 4630152 attribute is a ProductionConfirmationRecordTypeCode 4630156 datatype. The ProductionConfirmationRecordTypeCode 4630152 attribute has a cardinality of zero or one 4630154 meaning that for each instance of the Operation 4630118 entity there may be one ProductionConfirmationRecordTypeCode 4630152 attribute.

The Alternative 4630158 entity has a cardinality of one or n 4630160 meaning that for each instance of the Operation 4630118 entity there are one or more Alternative 4630158 entities. The Alternative 4630158 entity includes various attributes, namely ID 4630162, ResourceID 4630168, ProcessingDuration 4630174, PriorityValue 4630180 and ActiveIndicator 4630186.

The ID 4630162 attribute is an OperationAlternativeID 4630166 datatype. The ID 4630162 attribute has a cardinality of one 4630164 meaning that for each instance of the Alternative 4630158 entity there is one ID 4630162 attribute.

The ResourceID 4630168 attribute is a ResourceID 4630172 datatype. The ResourceID 4630168 attribute has a cardinality of one 4630170 meaning that for each instance of the Alternative 4630158 entity there is one ResourceID 4630168 attribute.

The ProcessingDuration 4630174 attribute is a ProcessingTIME_Duration 4630178 datatype. The ProcessingDuration 4630174 attribute has a cardinality of zero or one 4630176 meaning that for each instance of the Alternative 4630158 entity there may be one ProcessingDuration 4630174 attribute.

The PriorityValue 4630180 attribute is a PriorityValue 4630184 datatype. The PriorityValue 4630180 attribute has a cardinality of one 4630182 meaning that for each instance of the Alternative 4630158 entity there is one PriorityValue 4630180 attribute.

The ActiveIndicator 4630186 attribute is an ActiveIndicator 4630190 datatype. The ActiveIndicator 4630186 attribute has a cardinality of one 4630188 meaning that for each instance of the Alternative 4630158 entity there is one ActiveIndicator 4630186 attribute.

The Activity 4630192 entity has a cardinality of one or n 4630194 meaning that for each instance of the Operation 4630118 entity there are one or more Activity 4630192 entities. The Activity 4630192 entity includes various attributes, namely OperationID 4630196, OperationActivityTypeCode 4630202, EngineeringChangeOrderID 4630208, ProcessingDuration 4630214, PlannedPeriod 4630220, FixedIndicator 4630226 and ProductionConfirmationRecordTypeCode 4630232. The Activity 4630192 entity has various subordinate entities, namely Relationship 4630238 and PropertyValuation 4630266.

The OperationID 4630196 attribute is an OperationID 4630200 datatype. The OperationID 4630196 attribute has a cardinality of one 4630198 meaning that for each instance of the Activity 4630192 entity there is one OperationID 4630196 attribute.

The OperationActivityTypeCode 4630202 attribute is an OperationActivityTypeCode 4630206 datatype. The OperationActivityTypeCode 4630202 attribute has a cardinality of one 4630204 meaning that for each instance of the Activity 4630192 entity there is one OperationActivityTypeCode 4630202 attribute.

The EngineeringChangeOrderID 4630208 attribute is an EngineeringChangeOrderID 4630212 datatype. The EngineeringChangeOrderID 4630208 attribute has a cardinality of zero or one 4630210 meaning that for each instance of the Activity 4630192 entity there may be one EngineeringChangeOrderID 4630208 attribute.

The ProcessingDuration 4630214 attribute is a ProcessingTIME_Duration 4630218 datatype. The ProcessingDuration 4630214 attribute has a cardinality of zero or one 4630216 meaning that for each instance of the Activity 4630192 entity there may be one ProcessingDuration 4630214 attribute.

The PlannedPeriod 4630220 attribute is a PlannedUPPEROPEN_LOCALNORMALISED_DateTimePeriod 4630224 datatype. The PlannedPeriod 4630220 attribute has a cardinality of zero or one 4630222 meaning that for each instance of the Activity 4630192 entity there may be one PlannedPeriod 4630220 attribute.

The FixedIndicator 4630226 attribute is a FixedIndicator 4630230 datatype. The FixedIndicator 4630226 attribute has a cardinality of zero or one 4630228 meaning that for each instance of the Activity 4630192 entity there may be one FixedIndicator 4630226 attribute.

The ProductionConfirmationRecordTypeCode 4630232 attribute is a ProductionConfirmationRecordTypeCode 4630236 datatype. The ProductionConfirmationRecordTypeCode 4630232 attribute has a cardinality of zero or one 4630234 meaning that for each instance of the Activity 4630192 entity there may be one ProductionConfirmationRecordTypeCode 4630232 attribute.

The Relationship 4630238 entity has a cardinality of zero or n 4630240 meaning that for each instance of the Activity 4630192 entity there may be one or more Relationship 4630238 entities. The Relationship 4630238 entity includes various attributes, namely SuccessorOperationID 4630242, SuccessorOperationActivityTypeCode 4630248, NetworkPlanElementSuccessionTypeCode 4630254 and NetMinimumDuration 4630260.

The SuccessorOperationID 4630242 attribute is a SuccessorOperationID 4630246 datatype. The SuccessorOperationID 4630242 attribute has a cardinality of one 4630244 meaning that for each instance of the Relationship 4630238 entity there is one SuccessorOperationID 4630242 attribute.

The SuccessorOperationActivityTypeCode 4630248 attribute is a SuccessorOperationActivityTypeCode 4630252 datatype. The SuccessorOperationActivityTypeCode 4630248 attribute has a cardinality of one 4630250 meaning that for each instance of the Relationship 4630238 entity there is one SuccessorOperationActivityTypeCode 4630248 attribute.

The NetworkPlanElementSuccessionTypeCode 4630254 attribute is a NetworkPlanElementSuccessionTypeCode 4630258 datatype. The NetworkPlanElementSuccessionTypeCode 4630254 attribute has a cardinality of one 4630256 meaning that for each instance of the Relationship 4630238 entity there is one NetworkPlanElementSuccessionTypeCode 4630254 attribute.

The NetMinimumDuration 4630260 attribute is a MinimumTIME_Duration 4630264 datatype. The NetMinimumDuration 4630260 attribute has a cardinality of zero or one 4630262 meaning that for each instance of the Relationship 4630238 entity there may be one NetMinimumDuration 4630260 attribute.

The PropertyValuation 4630266 entity has a cardinality of zero or n 4630268 meaning that for each instance of the Activity 4630192 entity there may be one or more PropertyValuation 4630266 entities. The PropertyValuation 4630266 entity includes various attributes, namely PropertyID 4630270, PropertyValue 4630276 and PropertyValueName 4630282.

The PropertyID 4630270 attribute is a PropertyID 4630274 datatype. The PropertyID 4630270 attribute has a cardinality of one 4630272 meaning that for each instance of the PropertyValuation 4630266 entity there is one PropertyID 4630270 attribute.

The PropertyValue 4630276 attribute is a PropertyValue 4630280 datatype. The PropertyValue 4630276 attribute has a cardinality of one 4630278 meaning that for each instance of the PropertyValuation 4630266 entity there is one PropertyValue 4630276 attribute.

The PropertyValueName 4630282 attribute is a PropertyValueMEDIUM_Name 4630286 datatype. The PropertyValueName 4630282 attribute has a cardinality of zero or one 4630284 meaning that for each instance of the PropertyValuation 4630266 entity there may be one PropertyValueName 4630282 attribute.

The CapacityRequirement 4630288 package includes a CapacityRequirement 4630290 entity.

The CapacityRequirement 4630290 entity has a cardinality of one or n 4630292 meaning that for each instance of the ProductionPlanningOrder 463016 entity there are one or more CapacityRequirement 4630290 entities. The CapacityRequirement 4630290 entity includes various attributes, namely OperationAlternativeID 4630294, OperationID 4630300, OperationActivityTypeCode 4630306, ResourceID 4630312, ResourceTypeCode 4630318, ProcessingDuration 4630324, ActiveIndicator 4630330 and PlannedPeriod 4630336. The CapacityRequirement 4630290 entity includes a Relationship 4630342 subordinate entity.

The OperationAlternativeID 4630294 attribute is an OperationAlternativeID 4630298 datatype. The OperationAlternativeID 4630294 attribute has a cardinality of one 4630296 meaning that for each instance of the CapacityRequirement 4630290 entity there is one OperationAlternativeID 4630294 attribute.

The OperationID 4630300 attribute is an OperationID 4630304 datatype. The OperationID 4630300 attribute has a cardinality of one 4630302 meaning that for each instance of the CapacityRequirement 4630290 entity there is one OperationID 4630300 attribute.

The OperatiolActivityTypeCode 4630306 attribute is an OperationActivityTypeCode 4630310 datatype. The OperationActivityTypeCode 4630306 attribute has a cardinality of one 4630308 meaning that for each instance of the CapacityRequirement 4630290 entity there is one OperationActivityTypeCode 4630306 attribute.

The ResourceID 4630312 attribute is a ResourceID 4630316 datatype. The ResourceID 4630312 attribute has a cardinality of one 4630314 meaning that for each instance of the CapacityRequirement 4630290 entity there is one ResourceID 4630312 attribute.

The ResourceTypeCode 4630318 attribute is a ResourceTypeCode 4630322 datatype. The ResourceTypeCode 4630318 attribute has a cardinality of one 4630320 meaning that for each instance of the CapacityRequirement 4630290 entity there is one ResourceTypeCode 4630318 attribute.

The ProcessingDuration 4630324 attribute is a ProcessingTIME_Duration 4630328 datatype. The ProcessingDuration 4630324 attribute has a cardinality of zero or one 4630326 meaning that for each instance of the CapacityRequirement 4630290 entity there may be one ProcessingDuration 4630324 attribute.

The ActiveIndicator 4630330 attribute is an ActiveIndicator 4630334 datatype. The ActiveIndicator 4630330 attribute has a cardinality of zero or one 4630332 meaning that for each instance of the CapacityRequirement 4630290 entity there may be one ActiveIndicator 4630330 attribute.

The PlannedPeriod 4630336 attribute is a PlannedUPPEROPEN_LOCALNORMALISED_DateTimePeriod 4630340 datatype. The PlannedPeriod 4630336 attribute has a cardinality of zero or one 4630338 meaning that for each instance of the CapacityRequirement 4630290 entity there may be one PlannedPeriod 4630336 attribute.

The Relationship 4630342 entity has a cardinality of zero or n 4630344 meaning that for each instance of the CapacityRequirement 4630290 entity there may be one or more Relationship 4630342 entities. The Relationship 4630342 entity includes a SuccessorOperationAlternativeID 4630346 attribute.

The SuccessorOperationAlternativeID 4630346 attribute is a SuccessorOperationAlternativeID 4630350 datatype. The SuccessorOperationAlternativeID 4630346 attribute has a cardinality of one 4630348 meaning that for each instance of the Relationship 4630342 entity there is one SuccessorOperationAlternativeID 4630346 attribute.

The Component 4630376 package includes a MaterialOutput 4630378 entity.

The MaterialOutput 4630378 entity has a cardinality of one or n 4630380 meaning that for each instance of the ProductionPlanningOrder 463016 entity there are one or more MaterialOutput 4630378 entities.

The Log 4630700 package is a Log 4630706 datatype. The Log 4630700 package includes a Log 4630702 entity.

The Log 4630702 entity has a cardinality of one 4630704 meaning that for each instance of the ProductionPlanningOrderByIDResponseMessage_sync 463002 entity there is one Log 4630702 entity.

MessageHeader Package

A MessageHeader package groups the business information that is relevant for sending a business document in a message. It contains the MessageHeader entity.

MessageHeader

A MessageHeader contains the information to identify a business document in a message from the perspective of the sending application.

ProductionPlanningOrder Package

The ProductionPlanningOrder package groups the information relevant to describe a ProductionPlanningOrder. It contains the ProductionPlanningOrder entity. It contains the Operation, CapacityRequirement, and Component packages.

ProductionPlanningOrder

Within the material requirements planning a ProductionPlanningOrder is a request to initiate the in-house production of a particular quantity of a material on a defined date. ID is an identifier for a production planning order. PlanningVersionID is a unique identifier for a Planning Version containing all necessary master and transaction data for planning. SupplyPlanningAreaID is a unique identifier of a SupplyPlanningArea for which the ProductionPlanningOrder is planned. ProductionModelID is a unique identifier for a ProductionModel containing the production process for manufacturing the MaterialOutput. SystemAdministrativeData is an administrative data for the production planning order. This data includes system users and change times. SourceOfSupplyExplosionDate is a date for which the source of supply was exploded. TypeCode is a coded representation of the document type that occurs in business transactions. LogisticsPlanningDetailLevelCode specifies the level of detail of planning. ValidityPeriod is a validity period of the production planning order. PlannedPeriod is a period which the production planning order is dispatched to. OpeningDateTime is a point in time at which production can be requested for the production planning order in order to ensure that the goods that are to be ordered are received in time. FixedIndicator specifies whether the production planning order is fixed or not. SourceOfSupplyFixedIndicator specifies whether the source of supply is fixed for the production planning order or not. ConversionAllowedIndicator specifies that it is allowed to convert the ProductionPlanningOrder into a ProductionOrder. MaterialSupplyAndDemandStatusCode is a coded representation of the status of material supplies and material requirements. LifeCycleStatusCode describes the planning status of the operation.

Operation Package

The Operation package contains the Operation, Alternative, Activity, Relationship, and PropertyValuation entities.

Operation

In the production planning order, an Operation is a planning-based, and therefore sometimes approximate, representation of one or more operations in production. ID is a unique identifier of an operation. Description is a description of an operation. PlannedPeriod is a period which the operation is scheduled to. The period is derived from the scheduling of the operation. PlannedDuration is a duration of the period which the operation is scheduled to. FixedIndicator specifies the operation is fixed on a resource at a specific time. ProductionConfirmationRecordTypeCode is a coded representation of the type of production confirmation record, describing the execution status of the Operation.

Alternative

An Alternative entity is a planning alternative for an operation. ID is an identifier for an operation alternative. ResourceID is a unique identifier of the resource to which the capacity requirements of the operation alternative are scheduled. ProcessingDuration is a processing duration of the operation if the operation alternative is active. PriorityValue is a representation of the priority of the operation alternative used when choosing the active alternative of an operation. ActiveIndicator specifies whether this is the operation alternative that is active in scheduling.

If alternative process flows or alternative assignments for the main resource are maintained in the process definition, several planning alternatives are normally created for an operation. In principal, one planning alternative is created per process flow and per assignment of a main resource. In this respect, there is also one planning alternative, if the process flow and the main resource assignment of an operation is uniquely specified Activity From a planning point of view, an Activity is a basic work step in an operation during the execution of the production planning order. OperationID is a unique identifier of an operation. OperationActivityTypeCode is a coded representation of a categorization of activities in an operation. The type categorizes activities according to task. EngineeringChangeOrderID is a unique identifier for an engineering change order. An engineering change order is a set of instructions to a number of objects from the areas of engineering or production. It defines the conditions under which these changes become effective and specifies the release status of these changes. ProcessingDuration is a duration of the work step represented by the activity. PlannedPeriod is a period in which the activity is scheduled to be carried out. FixedIndicator specifies the activity is fixed on a resource at a specific time. ProductionConfirmationRecordTypeCode is a coded representation of the type of production confirmation record, describing the execution status of the Activity.

Relationship

A Relationship is a sequence relationship between two planning activities. SuccessorOperationID is a unique identifier of the successor operation i.e. the operation to which the relationship leads. SuccessorOperationActivityTypeCode is a coded representation of the SuccessorOperationActivity type within the SuccessorOperation, that is, the OperationActivity to which the relationship leads. NetworkPlanElementSuccessionTypeCode specifies the type of the relationship between predecessor and successor activity. NetMinimumDuration specifies the minimum (time) interval, without breaks and interruptions, that should be maintained between the predecessor and the successor activities. Relationships between activities are used to represent complex process flows in the in-house production process, such as parallel sequences of operations and activities. In this case, relationships are used to describe the branching and rejoining of process flows. In addition, these relationships contain planning parameters such as the minimum interval between two activities.

PropertyValuation

A PropertyValuation is the value of the property assigned to the activity. PropertyID is a unique identifier for a property. PropertyValue describes a value that can be assigned to a property. PropertyValueName describes the name of the PropertyValue.

Capacity Requirement Package

The Capacity Requirement package contains the CapacityRequirement and CapacityRequirementRelationship entities.

CapacityRequirement

CapacityRequirement represents the capacity of a work centre which is planned to be required for production execution.

OperationAlternativeID is an identifier for the operation alternative to which the capacity requirement is assigned. OperationID is a unique identifier of an operation. OperationActivityTypeCode is a coded representation of a categorization of activities in an operation. The type categorizes activities according to task. ResourceID is a unique identifier of the resource. ResourceTypeCode is a coded representation of the type of resource within a logistics facility. ProcessingDuration is a processing duration that the capacity requirement occupies at the resource. ActiveIndicator specifies whether the capacity requirement belongs to the active operation alternative. PlannedPeriod is a period in which the capacity requirement is planned. The period is specified if the capacity requirement belongs to the operation alternative that is active in scheduling.

Relationship

A Relationship entity is a sequence relationship between two capacity requirements. SuccessorOperationAlternativeID is an identifier for the SuccessorOperationAlternative for a CapacityRequirement. SuccessorOperationID is a unique identifier of the SuccessorOperation for a CapacityRequirement. SuccessorOperationActivityTypeCode is a coded representation of the SuccessorOperationActivityTypeCode for a CapacityRequirement. SuccessorResourceID is a unique identifier of the SuccessorResource. ResourceTypeCode is a coded representation of the type of resource within a logistics facility.

Component Package

The Component package contains the MaterialOutput, PropertyValuation, MaterialInput and PropertyValuation entities.

MaterialOutput

A MaterialOutput represents a material which is planned to be produced. ID is a position of a MaterialOutput within the ProductionPlanningOrder. ProductInternalID is a proprietary identifier for a MaterialOutput. SupplyPlanningAreaID is a unique identifier of a SupplyPlanningArea for which a stock receipt is planned via the production of the MaterialOutput.

InventorySpecialStockTypeCode is a coded representation of inventory special stock type of the MaterialOutput. AccountAssignmentObjectName is a name identifying the account assignment object to which MaterialOutput is assigned. MaterialRoleCode is a role of the material in the production process and therefore the specialization of the MaterialOutput in the main material output, by-product output, or intermediate product output. MaterialSupplyAndDemandTypeCode specifies the type of supply of the material output. EngineeringChangeOrderID is a unique identifier for an engineering change order. An engineering change order is a set of instructions to a number of objects from the areas of engineering or production. It defines the conditions under which these changes become effective and specifies the release status of these changes. OperationID is a unique identifier of an operation. An operation is a self-contained section of a process in a logistics process description that is normally completely executed on one or more resources that represent the main resources. OperationActivityTypeCode is a coded representation of a categorization of activities in an operation. The type categorizes activities according to task. GroupID is a unique identifier of the group of material outputs to which the material output is assigned. ProductAvailabilityConfirmationStatusCode is a coded representation of the status of a confirmation given by a product availability check. ConfirmedAvailabilityDateTime is a confirmation DateTime returned by a successful product availability check. ConfirmedQuantity is a confirmed quantity returned by a successful product availability check. ConfirmedQuantityTypeCode is a coded representation of the type of the confirmed quantity returned by a product availability check. ProductionDateTime is a date/time on which production of the material output is planned to take place. AvailabilityDateTime is a date/time on which the material output should be available. PlannedQuantity is a planned quantity of the material output considering the quantity already produced, but not considering expected scrap. PlannedQuantityTypeCode is a coded representation of the type of the planned quantity of the material output. TotalQuantity is a total quantity of the material output including expected scrap. TotalQuantityTypeCode is a coded representation of the type of the total quantity of the material output. PriorityValue is a representation of the priority of the MaterialOutput. The priority is inherited from the corresponding customer requirement if specified but can be changed manually in planning processes. FixedIndicator specifies whether the material output is fixed or not.

PropertyValuation

A PropertyValuation is the value of the property assigned to the activity. PropertyID is a unique identifier for a property. PropertyValue describes a value that can be assigned to a property. PropertyValueName describes the name of the PropertyValue.

MaterialInput

A MaterialInput represents a material which is needed for producing the output materials. ID is a position of a MaterialInput within the ProductionPlanningOrder. ProductInternalID is a proprietary identifier for a MaterialInput. SupplyPlanningAreaID is a unique identifier of a SupplyPlanningArea to which the MaterialInput relates. MaterialRoleCode is a role of the material in the production process and therefore the specialization of the MaterialInput in the ComponentInput or intermediate ProductInput. MaterialSupplyAndDemandTypeCode is a type of demand of the material input. EngineeringChangeOrderID is a unique identifier for an engineering change order. An engineering change order is a set of instructions to a number of objects from the areas of engineering or production. It defines the conditions under which these changes become effective and specifies the release status of these changes. LogisticsAreaID is a unique identifier for a LogisticsArea for storage of the MaterialInput before it is consumed. OperationID is a unique identifier of an operation. OperationActivityTypeCode is a coded representation of a categorization of activities in an operation. The type categorizes activities according to task. GroupID is a unique identifier of the group of material inputs to which the material input is assigned. ProductAvailabilityConfirmationStatusCode is a coded representation of the status of a confirmation given by a product availability check. ConfirmedAvailabilityDateTime is a confirmation DateTime returned by a successful product availability check. ConfirmedQuantity is a confirmed quantity returned by a successful product availability check. ConfirmedQuantityTypeCode is a coded representation of the type of the confirmed quantity returned by a product availability check. IssuingStatusCode is a coded representation of the status indicating whether the MaterialInput has been issued from stock or not. DueDateTime is a point in time at which the material input in due. PlannedQuantity is a planned quantity of the material input considering the quantity already withdrawn for production, but not considering the expected scrap. PlannedQuantityTypeCode is a coded representation of the type of the planned quantity of the material input. TotalQuantity is a total quantity of the material input considering expected scrap. TotalQuantityTypeCode is a coded representation of the type of the planned quantity of the material input. PriorityValue is a representation of the priority of the MaterialInput. The priority is inherited from the corresponding customer requirement if specified but can be changed manually in planning processes. FixedIndicator specifies whether the material input is fixed or not.

PropertyValuation

A PropertyValuation is the value of the property assigned to the activity. PropertyID is a unique identifier for a property. PropertyValue describes a value that can be assigned to a property. PropertyValueName describes the name of the PropertyValue.

Log Package

A log is a sequence of messages that may result from the execution of an application task.

ProductionProposal Interfaces

In the supply chain planning process the Supply Chain Planner needs to model the production of goods at production locations. To plan the production of a certain quantity of a product at a certain location at a certain time using different inhouse production sources, the Supply Chain Planner uses Production Proposals. The Supply Chain Planner creates changes deletes and queries Production Proposals in the Supply and Demand Matching process component.

Message Choreography

The message choreography of FIG. 473 describes a possible logical sequence of messages that can be used to realize a production proposal business scenario.

A ProductionProposalCreateRequest_sync is a request from the Supply Chain Planner to create a production proposal. The structure of the message type ProductionProposalCreateRequest_sync is specified by the message data type ProductionProposalCreateRequestMessage_sync.

A ProductionProposalCreateConfirmation_sync is a response from Supply And Demand Matching to a ProductionProposalCreateRequest_sync. The structure of the message type ProductionProposalCreateConfirmation_sync is specified by the message data type ProductionProposalCreateConfirmationMessage_sync.

A ProductionProposalChangeRequest_sync is a request from the Supply Chain Planner to change a production proposal. The structure of the message type ProductionProposalChangeRequest_sync is specified by the message data type ProductionProposalChangeRequestMessage_sync.

A ProductionProposalChangeConfirmation_sync is a response from Supply And Demand Matching to a ProductionProposalChangeRequest_sync. The structure of the message type ProductionProposalChangeConfirmation_sync is specified by the message data type ProductionProposalChangeConfirmationMessage_sync.

A ProductionProposalCancelRequest_sync is a request from the Supply Chain Planner to cancel a production proposal. The structure of the message type ProductionProposalCancelRequest_sync is specified by message data type ProductionProposalCancelRequestMessage_sync.

A ProductionProposalCancelConfirmation_sync is a response from Supply And Demand Matching to a ProductionProposalCancelRequest_sync. The structure of the message type ProductionProposalCancelConfirmation_sync is specified by the message data type ProductionProposalCancelConfirmationMessage_sync.

A ProductionProposalByIDQuery_sync is an inquiry from the Supply Chain Planner to query one production proposal. The structure of the message type ProductionProposalByIDQuery_sync is specified by the message data type ProductionProposalByIDQueryMessage_sync.

A ProductionProposalByIDResponse_sync is a response from Supply And Demand Matching to a ProductionProposalByIDQuery_sync. The structure of the message type ProductionProposalByIDResponse_sync is specified by the message data type ProductionProposalByIDResponseMessage_sync.

A ProductionProposalByElementsQuery_sync is an inquiry from the Supply Chain Planner for production proposals that satisfies the selection criteria. The structure of the message type ProductionProposalByElementsQuery_sync is specified by the message data type ProductionProposalByElementsQueryMessage_sync.

A ProductionProposalByElementsResponse_sync is a response from Supply And Demand Matching to a ProductionProposalByElementsQuery_sync. The structure of the message type ProductionProposalByElementsResponse_sync is specified by the message data type ProductionProposalByElementsResponseMessage_sync.

For example, a "Planner" system 473002 can request to create a production proposal using the ProductionProposalCreateRequest_sync message 473006 as shown, for example, in FIG. 483. An "SCM Demand Planning" system 473004 can confirm the creation request using the ProductionProposalCreateConfirmation_sync message 473008 as shown, for example, in FIG. 482. The "Planner" system 473002 can query production proposals by ID using the ProductionProposalByIDQuery_sync message 473010 as shown, for example, in FIG. 476. The "SCM Demand Planning" system 473004 can respond to the query using the ProductionProposalByIDResponse_sync message 473012 as shown, for example, in FIG. 477. The "Planner" system 473002 can request to change a production proposal using the ProductionProposalChangeRequest_sync message 473014 as shown, for example, in FIG. 481. The "SCM Demand Planning" system 473004 can confirm the change request using the ProductionProposalChangeConfirmation_sync message 473016 as shown, for example, in FIG. 480. The "Planner" system 473002 can request to cancel a production proposal using the ProductionProposalCancelRequest_sync message 473018 as shown, for example, in FIG. 479. The "SCM Demand Planning" system 473004 can confirm the cancellation request using the ProductionProposalCancelConfirmation_sync message 473020 as shown, for example, in FIG. 478. The "Planner" system 473002 can query production proposals by elements using the ProductionProposalByElementsQuery_sync message 473022 as shown, for example, in FIG. 474. The "SCM Demand Planning" system 473004 can respond to the query using the ProductionProposalByElementsResponse_sync message 473024 as shown, for example, in FIG. 475.

Message Data Type

The message data type ProductionProposalCreateRequestMessage_sync contains the ProductionProposal included in the business document and the business information that is relevant for sending a business document in a message.

FIGS. 493-1 through 493-6 show a ProductionProposalCreateRequestMessage_sync 493000 package. The ProductionProposalCreateRequestMessage_sync 493000 package is a ProductionProposalCreateRequestMessage_sync 493004 datatype. The ProductionProposalCreateRequestMessage_sync 493000 package includes a ProductionProposalCreateRequestMessage_sync 493002 entity. The ProductionProposalCreateRequestMessage_sync 493000 package includes various packages, namely MessageHeader 493006 and ProductionProposal 4930116.

The MessageHeader 493006 package is a BusinessDocumentMessageHeader 493012 datatype. The MessageHeader 493006 package includes a MessageHeader 493008 entity.

The MessageHeader 493008 entity has a cardinality of one 493010 meaning that for each instance of the ProductionProposalCreateRequestMessage_sync 493002 entity there is one MessageHeader 493008 entity. The MessageHeader 493008 entity includes various attributes, namely ID 493014, ReferenceID 493020, CreationDateTime 493026, TestDataIndicator 493032, ReconciliationIndicator 493038 and SenderParty 493044.

The ID 493014 attribute is a BusinessDocumentMessageID 493018 datatype. The ID 493014 attribute has a cardinality of one 493016 meaning that for each instance of the MessageHeader 493008 entity there is one ID 493014 attribute.

The ReferenceID 493020 attribute is a BusinessDocumentMessageID 493024 datatype. The ReferenceID 493020 attribute has a cardinality of zero or one 493022 meaning that for each instance of the MessageHeader 493008 entity there may be one ReferenceID 493020 attribute.

The CreationDateTime 493026 attribute is a GLOBAL_DateTime 493030 datatype. The CreationDateTime 493026 attribute has a cardinality of one 493028 meaning that for each instance of the MessageHeader 493008 entity there is one CreationDateTime 493026 attribute.

The TestDataIndicator 493032 attribute is an Indicator 493036 datatype. The TestDataIndicator 493032 attribute has a cardinality of zero or one 493034 meaning that for each instance of the MessageHeader 493008 entity there may be one TestDataIndicator 493032 attribute.

The ReconciliationIndicator 493038 attribute is an Indicator 493042 datatype. The ReconciliationIndicator 493038 attribute has a cardinality of zero or one 493040 meaning that for each instance of the MessageHeader 493008 entity there may be one ReconciliationIndicator 493038 attribute.

The SenderParty 493044 attribute is a BusinessDocumentMessageHeaderParty 493048 datatype. The SenderParty 493044 attribute has a cardinality of zero or one 493046 meaning that for each instance of the MessageHeader 493008 entity there may be one SenderParty 493044 attribute.

The ProductionProposal 4930116 package includes a ProductionProposal 4930118 entity.

The ProductionProposal 4930118 entity has a cardinality of one 4930120 meaning that for each instance of the ProductionProposalCreateRequestMessage_sync 493002 entity there is one ProductionProposal 4930118 entity. The ProductionProposal 4930118 entity includes various attributes, namely PlanningVersionID 4930122, LocationInternalID 4930128, ProductInternalID 4930134, Quantity 4930140, AvailabilityDateTime 4930146 and SourceOfSupplyReference 4930152.

The PlanningVersionID 4930122 attribute is a PlanningVersionID 4930126 datatype. The PlanningVersionID 4930122 attribute has a cardinality of one 4930124 meaning that for each instance of the ProductionProposal 4930118 entity there is one PlanningVersionID 4930122 attribute.

The LocationInternalID 4930128 attribute is a LocationInternalID 4930132 datatype. The LocationInternalID 4930128 attribute has a cardinality of one 4930130 meaning that for each instance of the ProductionProposal 4930118 entity there is one LocationInternalID 4930128 attribute.

The ProductInternalID 4930134 attribute is a ProductInternalID 4930138 datatype. The ProductInternalID 4930134 attribute has a cardinality of one 4930136 meaning that for each instance of the ProductionProposal 4930118 entity there is one ProductInternalID 4930134 attribute.

The Quantity 4930140 attribute is a Quantity 4930144 datatype. The Quantity 4930140 attribute has a cardinality of one 4930142 meaning that for each instance of the ProductionProposal 4930118 entity there is one Quantity 4930140 attribute.

The AvailabilityDateTime 4930146 attribute is a GLOBAL_DateTime 4930150 datatype. The AvailabilityDateTime 4930146 attribute has a cardinality of one 4930148 meaning that for each instance of the ProductionProposal 4930118 entity there is one AvailabilityDateTime 4930146 attribute.

The SourceOfSupplyReference 4930152 attribute is a SourceOfSupplyReference 4930156 datatype. The SourceOfSupplyReference 4930152 attribute has a cardinality of one 4930154 meaning that for each instance of the ProductionProposal 4930118 entity there is one SourceOfSupplyReference 4930152 attribute.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types the MessagerHeader is of type GDT: BusinessDocumentMessageHeader, whereby the following elements of the GDT are used: ID or UUID, CreationDateTime, BusinessScopeBusinessProcess. For all Confirmation or Response message data types the MessageHeader is of type GDT: BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. PlanningVersionID is a unique identifier for a Planning Version. In this context it is the identifier of the relevant Planning Version. A LocationInternalID is a proprietary identifier for a location. In this context it is the Location where production should take place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Message Data Type

The message data type ProductionProposalCreateConfirmationMessage_sync contains the ProductionProposal included in the business document and the business information that is relevant for sending a business document in a message.

FIGS. 492-1 through 492-4 show a ProductionProposalCreateConfirmationMessage_sync 492000 package. The ProductionProposalCreateConfirmationMessage_sync 492000 package is a ProductionProposalCreateConfirmationMessage_sync 492004 datatype. The ProductionProposalCreateConfirmationMessage_sync 492000 package includes a ProductionProposalCreateConfirmationMessage_sync 492002 entity. The ProductionProposalCreateConfirmationMessage_sync 492000 package includes various packages, namely MessageHeader 492006, ProductionProposal 492038 and Log 4920104.

The MessageHeader 492006 package is a BasicBusinessDocumentMessageHeader 492012 datatype. The MessageHeader 492006 package includes a MessageHeader 492008 entity.

The MessageHeader 492008 entity has a cardinality of one 492010 meaning that for each instance of the ProductionProposalCreateConfirmationMessage_sync 492002 entity there is one MessageHeader 492008 entity. The MessageHeader 492008 entity includes various attributes, namely ID 492014, UUID 492020, ReferenceID 492026 and ReferenceUUID 492032.

The ID 492014 attribute is a BusinessDocumentMessageID 492018 datatype. The ID 492014 attribute has a cardinality of zero or one 492016 meaning that for each instance of the MessageHeader 492008 entity there may be one ID 492014 attribute.

The UUID 492020 attribute is an ATTRIBUTEINDEPENDENT_UUID 492024 datatype. The UUID 492020 attribute has a cardinality of zero or one 492022 meaning that for each instance of the MessageHeader 492008 entity there may be one UUID 492020 attribute.

The ReferenceID 492026 attribute is a BusinessDocumentMessageID 492030 datatype. The ReferenceID 492026 attribute has a cardinality of zero or one 492028 meaning that for each instance of the MessageHeader 492008 entity there may be one ReferenceID 492026 attribute.

The ReferenceUUID 492032 attribute is an ATTRIBUTEINDEPENDENT_UUID 492036 datatype. The ReferenceUUID 492032 attribute has a cardinality of zero or one 492034 meaning that for each instance of the MessageHeader 492008 entity there may be one ReferenceUUID 492032 attribute.

The ProductionProposal 492038 package includes a ProductionProposal 492040 entity.

The ProductionProposal 492040 entity has a cardinality of zero or one 492042 meaning that for each instance of the ProductionProposalCreateConfirmationMessage_sync 492002 entity there may be one ProductionProposal 492040 entity. The ProductionProposal 492040 entity includes various attributes, namely ID 492044, PlanningVersionID 492050, LocationInternalID 492056, ProductInternalID 492062, Quantity 492068, AvailabilityDateTime 492074 and SourceOfSupplyReference 492080.

The ID 492044 attribute is a ProductionProposalID 492048 datatype. The ID 492044 attribute has a cardinality of one 492046 meaning that for each instance of the ProductionProposal 492040 entity there is one ID 492044 attribute.

The PlanningVersionID 492050 attribute is a PlanningVersionID 492054 datatype. The PlanningVersionID 492050 attribute has a cardinality of one 492052 meaning that for each instance of the ProductionProposal 492040 entity there is one PlanningVersionID 492050 attribute.

The LocationInternalID 492056 attribute is a LocationInternalID 492060 datatype. The LocationInternalID 492056 attribute has a cardinality of one 492058 meaning that for each instance of the ProductionProposal 492040 entity there is one LocationInternalID 492056 attribute.

The ProductInternalID 492062 attribute is a ProductInternalID 492066 datatype. The ProductInternalID 492062 attribute has a cardinality of one 492064 meaning that for each instance of the ProductionProposal 492040 entity there is one ProductInternalID 492062 attribute.

The Quantity 492068 attribute is a Quantity 492072 datatype. The Quantity 492068 attribute has a cardinality of one 492070 meaning that for each instance of the ProductionProposal 492040 entity there is one Quantity 492068 attribute.

The AvailabilityDateTime 492074 attribute is a GLOBAL_DateTime 492078 datatype. The AvailabilityDateTime 492074 attribute has a cardinality of one 492076 meaning that for each instance of the ProductionProposal 492040 entity there is one AvailabilityDateTime 492074 attribute.

The SourceOfSupplyReference 492080 attribute is a SourceOfSupplyReference 492084 datatype. The SourceOfSupplyReference 492080 attribute has a cardinality of one 492082 meaning that for each instance of the ProductionProposal 492040 entity there is one SourceOfSupplyReference 492080 attribute.

The Log 4920104 package is a Log 4920110 datatype. The Log 4920104 package includes a Log 4920106 entity.

The Log 4920106 entity has a cardinality of one 4920108 meaning that for each instance of the ProductionProposalCreateConfirmationMessage_sync 492002 entity there is one Log 4920106 entity. The Log 4920106 entity includes various attributes, namely BusinessDocumentProcessingResultCode 4920112, MaximumLogItemSeverityCode 4920118 and Item 4920124.

The BusinessDocumentProcessingResultCode 4920112 attribute is a ProcessingResultCode 4920116 datatype. The BusinessDocumentProcessingResultCode 4920112 attribute has a cardinality of zero or one 4920114 meaning that for each instance of the Log 4920106 entity there may be one BusinessDocumentProcessingResultCode 4920112 attribute.

The MaximumLogItemSeverityCode 4920118 attribute is a LogItemSeverityCode 4920122 datatype. The MaximumLogItemSeverityCode 4920118 attribute has a cardinality of zero or one 4920120 meaning that for each instance of the Log 4920106 entity there may be one MaximumLogItemSeverityCode 4920118 attribute.

The Item 4920124 attribute is a LogItem 4920128 datatype. The Item 4920124 attribute has a cardinality of zero or n 4920126 meaning that for each instance of the Log 4920106 entity there may be one or more Item 4920124 attributes.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types the MessagerHeader is of type GDT: BusinessDocumentMessageHeader, whereby the following elements of the GDT are used: ID or UUID, CreationDateTime, BusinessScopeBusinessProcess. For all Confirmation or Response message data types the MessageHeader is of type GDT: BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal. PlanningVersionID is a unique identifier for a Planning Version. In this context it is the identifier of the relevant Planning Version. A LocationInternalID is a proprietary identifier for a location. In this context it is the Location where production takes place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Log Package

A log is a sequence of messages that result when an application executes a task.

Message Data Type

The message data type ProductionProposalChangeRequestMessage_sync contains the ProductionProposal included in the business document and the business information that is relevant for sending a business document in a message.

FIGS. 491-1 through 491-5 show a ProductionProposalChangeRequestMessage_sync 491000 package. The ProductionProposalChangeRequestMessage_sync 491000 package is a ProductionProposalChangeRequestMessage_sync 491004 datatype. The ProductionProposalChangeRequestMessage_sync 491000 package includes a ProductionProposalChangeRequestMessage_sync 491002 entity. The ProductionProposalChangeRequestMessage_sync 491000 package includes various packages, namely MessageHeader 491006 and ProductionProposal 4910116.

The MessageHeader 491006 package is a BusinessDocumentMessageHeader 491012 datatype. The MessageHeader 491006 package includes a MessageHeader 491008 entity.

The MessageHeader 491008 entity has a cardinality of one 491010 meaning that for each instance of the ProductionProposalChangeRequestMessage_sync 491002 entity there is one MessageHeader 491008 entity. The MessageHeader 491008 entity includes various attributes, namely ID 491014, ReferenceID 491020, CreationDateTime 491026, TestDataIndicator 491032, ReconciliationIndicator 491038 and SenderParty 491044.

The ID 491014 attribute is a BusinessDocumentMessageID 491018 datatype. The ID 491014 attribute has a cardinality of one 491016 meaning that for each instance of the MessageHeader 491008 entity there is one ID 491014 attribute.

The ReferenceID 491020 attribute is a BusinessDocumentMessageID 491024 datatype. The ReferenceID 491020 attribute has a cardinality of zero or one 491022 meaning that for each instance of the MessageHeader 491008 entity there may be one ReferenceID 491020 attribute.

The CreationDateTime 491026 attribute is a GLOBAL_DateTime 491030 datatype. The CreationDateTime 491026 attribute has a cardinality of one 491028 meaning that for each instance of the MessageHeader 491008 entity there is one CreationDateTime 491026 attribute.

The TestDataIndicator 491032 attribute is an Indicator 491036 datatype. The TestDataIndicator 491032 attribute has a cardinality of zero or one 491034 meaning that for each instance of the MessageHeader 491008 entity there may be one TestDataIndicator 491032 attribute.

The ReconciliationIndicator 491038 attribute is an Indicator 491042 datatype. The ReconciliationIndicator 491038 attribute has a cardinality of zero or one 491040 meaning that for each instance of the MessageHeader 491008 entity there may be one ReconciliationIndicator 491038 attribute.

The SenderParty 491044 attribute is a BusinessDocumentMessageHeaderParty 491048 datatype. The SenderParty 491044 attribute has a cardinality of zero or one 491046 meaning that for each instance of the MessageHeader 491008 entity there may be one SenderParty 491044 attribute.

The ProductionProposal 4910116 package includes a ProductionProposal 4910118 entity.

The ProductionProposal 4910118 entity has a cardinality of one 4910120 meaning that for each instance of the ProductionProposalChangeRequestMessage_sync 491002 entity there is one ProductionProposal 4910118 entity. The ProductionProposal 4910118 entity includes various attributes, namely ID 4910122, Quantity 4910128, AvailabilityDateTime 4910134 and SourceOfSupplyReference 4910140.

The ID 4910122 attribute is a ProductionProposalID 4910126 datatype. The ID 4910122 attribute has a cardinality of one 4910124 meaning that for each instance of the ProductionProposal 4910118 entity there is one ID 4910122 attribute.

The Quantity 4910128 attribute is a Quantity 4910132 datatype. The Quantity 4910128 attribute has a cardinality of zero or one 4910130 meaning that for each instance of the ProductionProposal 4910118 entity there may be one Quantity 4910128 attribute.

The AvailabilityDateTime 4910134 attribute is a GLOBAL_DateTime 4910138 datatype. The AvailabilityDateTime 4910134 attribute has a cardinality of zero or one 4910136 meaning that for each instance of the ProductionProposal 4910118 entity there may be one AvailabilityDateTime 4910134 attribute.

The SourceOfSupplyReference 4910140 attribute is a SourceOfSupplyReference 4910144 datatype. The SourceOfSupplyReference 4910140 attribute has a cardinality of zero or one 4910142 meaning that for each instance of the ProductionProposal 4910118 entity there may be one SourceOfSupplyReference 4910140 attribute.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal that shall be changed. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Message Data Type

The message data type ProductionProposalChangeConfirmationMessage_sync contains the ProductionProposal included in the business document and the business information that is relevant for sending a business document in a message.

FIGS. 490-1 through 490-4 show a ProductionProposalChangeConfirmationMessage_sync 490000 package. The ProductionProposalChangeConfirmationMessage_sync 490000 package is a ProductionProposalChangeConfirmationMessage_sync 490004 datatype. The ProductionProposalChangeConfirmationMessage_sync 490000 package includes a ProductionProposalChangeConfirmationMessage_sync 490002 entity. The ProductionProposalChangeConfirmationMessage_sync 490000 package includes various packages, namely MessageHeader 490006, ProductionProposal 490038 and Log 4900104.

The MessageHeader 490006 package is a BasicBusinessDocumentMessageHeader 490012 datatype. The MessageHeader 490006 package includes a MessageHeader 490008 entity.

The MessageHeader 490008 entity has a cardinality of one 490010 meaning that for each instance of the ProductionProposalChangeConfirmationMessage_sync 490002 entity there is one MessageHeader 490008 entity. The MessageHeader 490008 entity includes various attributes, namely ID 490014, UUID 490020, ReferenceID 490026 and ReferenceUUID 490032.

The ID 490014 attribute is a BusinessDocumentMessageID 490018 datatype. The ID 490014 attribute has a cardinality of zero or one 490016 meaning that for each instance of the MessageHeader 490008 entity there may be one ID 490014 attribute.

The UUID 490020 attribute is an ATTRIBUTEINDEPENDENT_UUID 490024 datatype. The UUID 490020 attribute has a cardinality of zero or one 490022 meaning that for each instance of the MessageHeader 490008 entity there may be one UUID 490020 attribute.

The ReferenceID 490026 attribute is a BusinessDocumentMessageID 490030 datatype. The ReferenceID 490026 attribute has a cardinality of zero or one 490028 meaning that for each instance of the MessageHeader 490008 entity there may be one ReferenceID 490026 attribute.

The ReferenceUUID 490032 attribute is an ATTRIBUTEINDEPENDENT_UUID 490036 datatype. The ReferenceUUID 490032 attribute has a cardinality of zero or one 490034 meaning that for each instance of the MessageHeader 490008 entity there may be one ReferenceUUID 490032 attribute.

The ProductionProposal 490038 package includes a ProductionProposal 490040 entity.

The ProductionProposal 490040 entity has a cardinality of zero or one 490042 meaning that for each instance of the ProductionProposalChangeConfirmationMessage_sync 490002 entity there may be one ProductionProposal 490040 entity. The ProductionProposal 490040 entity includes various attributes, namely ID 490044, PlanningVersionID 490050, LocationInternalID 490056, ProductInternalID 490062, Quantity 490068, AvailabilityDateTime 490074 and SourceOfSupplyReference 490080.

The ID 490044 attribute is a ProductionProposalID 490048 datatype. The ID 490044 attribute has a cardinality of one 490046 meaning that for each instance of the ProductionProposal 490040 entity there is one ID 490044 attribute.

The PlanningVersionID 490050 attribute is a PlanningVersionID 490054 datatype. The PlanningVersionID 490050 attribute has a cardinality of one 490052 meaning that for each instance of the ProductionProposal 490040 entity there is one PlanningVersionID 490050 attribute.

The LocationInternalID 490056 attribute is a LocationInternalID 490060 datatype. The LocationInternalID 490056 attribute has a cardinality of one 490058 meaning that for each instance of the ProductionProposal 490040 entity there is one LocationInternalID 490056 attribute.

The ProductInternalID 490062 attribute is a ProductInternalID 490066 datatype. The ProductInternalID 490062 attribute has a cardinality of one 490064 meaning that for each instance of the ProductionProposal 490040 entity there is one ProductInternalID 490062 attribute.

The Quantity 490068 attribute is a Quantity 490072 datatype. The Quantity 490068 attribute has a cardinality of one 490070 meaning that for each instance of the ProductionProposal 490040 entity there is one Quantity 490068 attribute.

The AvailabilityDateTime 490074 attribute is a GLOBAL_DateTime 490078 datatype. The AvailabilityDateTime 490074 attribute has a cardinality of one 490076 meaning that for each instance of the ProductionProposal 490040 entity there is one AvailabilityDateTime 490074 attribute.

The SourceOfSupplyReference 490080 attribute is a SourceOfSupplyReference 490084 datatype. The SourceOfSupplyReference 490080 attribute has a cardinality of one 490082 meaning that for each instance of the ProductionProposal 490040 entity there is one SourceOfSupplyReference 490080 attribute.

The Log 4900104 package is a Log 4900110 datatype. The Log 4900104 package includes a Log 4900106 entity.

The Log 4900106 entity has a cardinality of one 4900108 meaning that for each instance of the ProductionProposalChangeConfirmationMessage_sync 490002 entity there is one Log 4900106 entity. The Log 4900106 entity includes various attributes, namely BusinessDocumentProcessingResultCode 4900112, MaximumLogItemSeverityCode 4900118 and Item 4900124.

The BusinessDocumentProcessingResultCode 4900112 attribute is a ProcessingResultCode 4900116 datatype. The BusinessDocumentProcessingResultCode 4900112 attribute has a cardinality of zero or one 4900114 meaning that for each instance of the Log 4900106 entity there may be one BusinessDocumentProcessingResultCode 4900112 attribute.

The MaximumLogItemSeverityCode 4900118 attribute is a LogItemSeverityCode 4900122 datatype. The MaximumLogItemSeverityCode 4900118 attribute has a cardinality of zero or one 4900120 meaning that for each instance of the Log 4900106 entity there may be one MaximumLogItemSeverityCode 4900118 attribute.

The Item 4900124 attribute is a LogItem 4900128 datatype. The Item 4900124 attribute has a cardinality of zero or n 4900126 meaning that for each instance of the Log 4900106 entity there may be one or more Item 4900124 attributes.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal.

PlanningVersionID is a unique identifier for a Planning Version. In this context it is the identifier of the relevant Planning Version. A LocationInternalID is a proprietary identifier for a location. In this context it is the Location where production takes place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Log Package

A log is a sequence of messages that result when an application executes a task.

Message Data Type

The message data type ProductionProposalCancelRequestMessage_sync contains the ProductionProposal included in the business document and the business information that is relevant for sending a business document in a message.

FIGS. 489-1 through 489-4 show a ProductionProposalCancelRequestMessage_sync 489000 package. The ProductionProposalCancelRequestMessage_sync 489000 package is a ProductionProposalCancelRequestMessage_sync 489004 datatype. The ProductionProposalCancelRequestMessage_sync 489000 package includes a ProductionProposalCancelRequestMessage_sync 489002 entity. The ProductionProposalCancelRequestMessage_sync 489000 package includes various packages, namely MessageHeader 489006 and ProductionProposal 4890116.

The MessageHeader 489006 package is a BusinessDocumentMessageHeader 489012 datatype. The MessageHeader 489006 package includes a MessageHeader 489008 entity.

The MessageHeader 489008 entity has a cardinality of one 489010 meaning that for each instance of the ProductionProposalCancelRequestMessage_sync 489002 entity there is one MessageHeader 489008 entity. The MessageHeader 489008 entity includes various attributes, namely ID 489014, ReferenceID 489020, CreationDateTime 489026, TestDataIndicator 489032, ReconciliationIndicator 489038 and SenderParty 489044.

The ID 489014 attribute is a BusinessDocumentMessageID 489018 datatype. The ID 489014 attribute has a cardinality of one 489016 meaning that for each instance of the MessageHeader 489008 entity there is one ID 489014 attribute.

The ReferenceID 489020 attribute is a BusinessDocumentMessageID 489024 datatype. The ReferenceID 489020 attribute has a cardinality of zero or one 489022 meaning that for each instance of the MessageHeader 489008 entity there may be one ReferenceID 489020 attribute.

The CreationDateTime 489026 attribute is a GLOBAL_DateTime 489030 datatype. The CreationDateTime 489026 attribute has a cardinality of one 489028 meaning that for each instance of the MessageHeader 489008 entity there is one CreationDateTime 489026 attribute.

The TestDataIndicator 489032 attribute is an Indicator 489036 datatype. The TestDataIndicator 489032 attribute has a cardinality of zero or one 489034 meaning that for each instance of the MessageHeader 489008 entity there may be one TestDataIndicator 489032 attribute.

The ReconciliationIndicator 489038 attribute is an Indicator 489042 datatype. The ReconciliationIndicator 489038 attribute has a cardinality of zero or one 489040 meaning that for each instance of the MessageHeader 489008 entity there may be one ReconciliationIndicator 489038 attribute.

The SenderParty 489044 attribute is a BusinessDocumentMessageHeaderParty 489048 datatype. The SenderParty 489044 attribute has a cardinality of zero or one 489046 meaning that for each instance of the MessageHeader 489008 entity there may be one SenderParty 489044 attribute.

The ProductionProposal 4890116 package includes a ProductionProposal 4890118 entity.

The ProductionProposal 4890118 entity has a cardinality of one 4890120 meaning that for each instance of the ProductionProposalCancelRequestMessage_sync 489002 entity there is one ProductionProposal 4890118 entity. The ProductionProposal 4890118 entity includes an ID 4890122 attribute.

The ID 4890122 attribute is a ProductionProposalID 4890126 datatype. The ID 4890122 attribute has a cardinality of one 4890124 meaning that for each instance of the ProductionProposal 4890118 entity there is one ID 4890122 attribute.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal that shall be canceled.

Message Data Type

The message data type ProductionProposalCancelConfirmationMessage_sync contains the ProductionProposal included in the business document and the business information that is relevant for sending a business document in a message.

FIGS. 488-1 through 488-4 show a ProductionProposalCancelConfirmationMessage_sync 488000 package. The ProductionProposalCancelConfirmationMessage_sync 488000 package is a ProductionProposalCancelConfirmationMessage_sync 488004 datatype. The ProductionProposalCancelConfirmationMessage_sync 488000 package includes a ProductionProposalCancelConfirmationMessage_sync 488002 entity. The ProductionProposalCancelConfirmationMessage_sync 488000 package includes various packages, namely MessageHeader 488006, ProductionProposal 488038 and Log 4880104.

The MessageHeader 488006 package is a BasicBusinessDocumentMessageHeader 488012 datatype. The MessageHeader 488006 package includes a MessageHeader 488008 entity.

The MessageHeader 488008 entity has a cardinality of one 488010 meaning that for each instance of the ProductionProposalCancelConfirmationMessage_sync 488002 entity there is one MessageHeader 488008 entity. The MessageHeader 488008 entity includes various attributes, namely ID 488014, UUID 488020, ReferenceID 488026 and ReferenceID 488032.

The ID 488014 attribute is a BusinessDocumentMessageID 488018 datatype. The ID 488014 attribute has a cardinality of zero or one 488016 meaning that for each instance of the MessageHeader 488008 entity there may be one ID 488014 attribute.

The UUID 488020 attribute is an ATTRIBUTEINDEPENDENT_UUID 488024 datatype. The UUID 488020 attribute has a cardinality of zero or one 488022 meaning that for each instance of the MessageHeader 488008 entity there may be one UUID 488020 attribute.

The ReferenceID 488026 attribute is a BusinessDocumentMessageID 488030 datatype. The ReferenceID 488026 attribute has a cardinality of zero or one 488028 meaning that for each instance of the MessageHeader 488008 entity there may be one ReferenceID 488026 attribute.

The ReferenceUUID 488032 attribute is an ATTRIBUTEINDEPENDENT_UUID 488036 datatype. The ReferenceUUID 488032 attribute has a cardinality of zero or one 488034 meaning that for each instance of the MessageHeader 488008 entity there may be one ReferenceUUID 488032 attribute.

The ProductionProposal 488038 package includes a ProductionProposal 488040 entity.

The ProductionProposal 488040 entity has a cardinality of zero or one 488042 meaning that for each instance of the ProductionProposalCancelConfirmationMessage_sync 488002 entity there may be one ProductionProposal 488040 entity. The ProductionProposal 488040 entity includes various attributes, namely ID 488044, PlanningVersionID 488050, LocationInternalID 488056, ProductInternalID 488062, Quantity 488068, AvailabilityDateTime 488074 and SourceOfSupplyReference 488080.

The ID 488044 attribute is a ProductionProposalID 488048 datatype. The ID 488044 attribute has a cardinality of one 488046 meaning that for each instance of the ProductionProposal 488040 entity there is one ID 488044 attribute.

The PlanningVersionID 488050 attribute is a PlanningVersionID 488054 datatype. The PlanningVersionID 488050 attribute has a cardinality of one 488052 meaning that for each instance of the ProductionProposal 488040 entity there is one PlanningVersionID 488050 attribute.

The LocationInternalID 488056 attribute is a LocationInternalID 488060 datatype. The LocationInternalID 488056 attribute has a cardinality of one 488058 meaning that for each instance of the ProductionProposal 488040 entity there is one LocationInternalID 488056 attribute.

The ProductInternalID 488062 attribute is a ProductInternalID 488066 datatype. The ProductInternalID 488062 attribute has a cardinality of one 488064 meaning that for each instance of the ProductionProposal 488040 entity there is one ProductInternalID 488062 attribute.

The Quantity 488068 attribute is a Quantity 488072 datatype. The Quantity 488068 attribute has a cardinality of one 488070 meaning that for each instance of the ProductionProposal 488040 entity there is one Quantity 488068 attribute.

The AvailabilityDateTime 488074 attribute is a GLOBAL_DateTime 488078 datatype. The AvailabilityDateTime 488074 attribute has a cardinality of one 488076 meaning that for each instance of the ProductionProposal 488040 entity there is one AvailabilityDateTime 488074 attribute.

The SourceOfSupplyReference 488080 attribute is a SourceOfSupplyReference 488084 datatype. The SourceOfSupplyReference 488080 attribute has a cardinality of one 488082 meaning that for each instance of the ProductionProposal 488040 entity there is one SourceOfSupplyReference 488080 attribute.

The Log 4880104 package is a Log 4880110 datatype. The Log 4880104 package includes a Log 4880106 entity.

The Log 4880106 entity has a cardinality of one 4880108 meaning that for each instance of the ProductionProposalCancelConfirmationMessage_sync 488002 entity there is one Log 4880106 entity. The Log 4880106 entity includes various attributes, namely BusinessDocumentProcessingResultCode 4880112, MaximumLogItemSeverityCode 4880118 and Item 4880124.

The BusinessDocumentProcessingResultCode 4880112 attribute is a ProcessingResultCode 4880116 datatype. The BusinessDocumentProcessingResultCode 4880112 attribute has a cardinality of zero or one 4880114 meaning that for each instance of the Log 4880106 entity there may be one BusinessDocumentProcessingResultCode 4880112 attribute.

The MaximumLogItemSeverityCode 4880118 attribute is a LogItemSeverityCode 4880122 datatype. The MaximumLogItemSeverityCode 4880118 attribute has a cardinality of zero or one 4880120 meaning that for each instance of the Log 4880106 entity there may be one MaximumLogItemSeverityCode 4880118 attribute.

The Item 4880124 attribute is a LogItem 4880128 datatype. The Item 4880124 attribute has a cardinality of zero or n 4880126 meaning that for each instance of the Log 4880106 entity there may be one or more Item 4880124 attributes.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal. PlanningVersionID is a unique identifier for a Planning Version. In this context it is the identifier of the relevant Planning Version. A LocationInternalID is a proprietary identifier for a location.

In this context it is the Location where production takes place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Log Package

A log is a sequence of messages that result when an application executes a task.

Message Data Type

The message data type ProductionProposalByIDQueryMessage_sync contains the ProductionProposal included in the business document and the business information that is relevant for sending a business document in a message.

FIGS. 486-1 through 486-5 show a ProductionProposalByIDQueryMessage_sync 486000 package. The ProductionProposalByIDQueryMessage_sync 486000 package is a ProductionProposalByIDQueryMessage_sync 486004 datatype. The ProductionProposalByIDQueryMessage_sync 486000 package includes a ProductionProposalByIDQueryMessage_sync 486002 entity. The ProductionProposalByIDQueryMessage_sync 486000 package includes various packages, namely MessageHeader 486006 and Selection 4860116.

The MessageHeader 486006 package is a BusinessDocumentMessageHeader 486012 datatype. The MessageHeader 486006 package includes a MessageHeader 486008 entity.

The MessageHeader 486008 entity has a cardinality of one 486010 meaning that for each instance of the ProductionProposalByIDQueryMessage_sync 486002 entity there is one MessageHeader 486008 entity. The MessageHeader 486008 entity includes various attributes, namely ID 486014, ReferenceID 486020, CreationDateTime 486026, TestDataIndicator 486032, ReconciliationIndicator 486038 and SenderParty 486044.

The ID 486014 attribute is a BusinessDocumentMessageID 486018 datatype. The ID 486014 attribute has a cardinality of one 486016 meaning that for each instance of the MessageHeader 486008 entity there is one ID 486014 attribute.

The ReferenceID 486020 attribute is a BusinessDocumentMessageID 486024 datatype. The ReferenceID 486020 attribute has a cardinality of zero or one 486022 meaning that for each instance of the MessageHeader 486008 entity there may be one ReferenceID 486020 attribute.

The CreationDateTime 486026 attribute is a GLOBAL_DateTime 486030 datatype. The CreationDateTime 486026 attribute has a cardinality of one 486028 meaning that for each instance of the MessageHeader 486008 entity there is one CreationDateTime 486026 attribute.

The TestDataIndicator 486032 attribute is an Indicator 486036 datatype. The TestDataIndicator 486032 attribute has a cardinality of zero or one 486034 meaning that for each instance of the MessageHeader 486008 entity there may be one TestDataIndicator 486032 attribute.

The ReconciliationIndicator 486038 attribute is an Indicator 486042 datatype. The ReconciliationIndicator 486038 attribute has a cardinality of zero or one 486040 meaning that for each instance of the MessageHeader 486008 entity there may be one ReconciliationIndicator 486038 attribute.

The SenderParty 486044 attribute is a BusinessDocumentMessageHeaderParty 486048 datatype. The SenderParty 486044 attribute has a cardinality of zero or one 486046 meaning that for each instance of the MessageHeader 486008 entity there may be one SenderParty 486044 attribute.

The Selection 4860116 package includes a ProductionProposalSelectionByID 4860118 entity.

The ProductionProposalSelectionByID 4860118 entity has a cardinality of one 4860120 meaning that for each instance of the ProductionProposalByIDQueryMessage_sync 486002 entity there is one ProductionProposalSelectionByID 4860118 entity. The ProductionProposalSelectionByID 4860118 entity includes a ProductionProposalID 4860122 attribute.

The ProductionProposalID 4860122 attribute is a ProductionProposalID 4860126 datatype. The ProductionProposalID 4860122 attribute has a cardinality of one 4860124 meaning that for each instance of the ProductionProposalSelectionByID 4860118 entity there is one ProductionProposalID 4860122 attribute.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

Selection Package

This package contains the ProductionProposalSelectionByID. This enables to query a production proposal in the Supply And Demand Matching.

ProductionProposalSelectionByID

The ProductionProposalSelectionByID contains the key field of the production proposal, in this way one production proposal can be queried. A ProductionProposalID is a unique identifier for a Production Proposal. In this context it refers to the Production Proposal that shall be selected.

Message Data Type

The message data type ProductionProposalByIDResponseMessage_sync contains the ProductionProposal included in the business document and the business information that is relevant for sending a business document in a message.

FIGS. 487-1 through 487-8 show a ProductionProposalByIDResponseMessage_sync 487000 package. The ProductionProposalByIDResponseMessage_sync 487000 package is a ProductionProposalByIDResponseMessage_sync 487004 datatype. The ProductionProposalByIDResponseMessage_sync 487000 package includes a ProductionProposalByIDResponseMessage_sync 487002 entity. The ProductionProposalByIDResponseMessage_sync 487000 package includes various packages, namely MessageHeader 487006, ProductionProposal 487038 and Log 4870210.

The MessageHeader 487006 package is a BasicBusinessDocumentMessageHeader 487012 datatype. The MessageHeader 487006 package includes a MessageHeader 487008 entity.

The MessageHeader 487008 entity has a cardinality of one 487010 meaning that for each instance of the ProductionProposalByIDResponseMessage_sync 487002 entity there is one MessageHeader 487008 entity. The MessageHeader 487008 entity includes various attributes, namely ID 487014, UUID 487020, ReferenceID 487026 and ReferenceUUID 487032.

The ID 487014 attribute is a BusinessDocumentMessageID 487018 datatype. The ID 487014 attribute has a cardinality of zero or one 487016 meaning that for each instance of the MessageHeader 487008 entity there may be one ID 487014 attribute.

The UUID 487020 attribute is an ATTRIBUTEINDEPENDENT_UUID 487024 datatype. The UUID 487020 attribute has a cardinality of zero or one 487022 meaning that for each instance of the MessageHeader 487008 entity there may be one UUID 487020 attribute.

The ReferenceID 487026 attribute is a BusinessDocumentMessageID 487030 datatype. The ReferenceID 487026 attribute has a cardinality of zero or one 487028 meaning that for each instance of the MessageHeader 487008 entity there may be one ReferenceID 487026 attribute.

The ReferenceUUID 487032 attribute is an ATTRIBUTEINDEPENDENT_UUID 487036 datatype. The ReferenceUUID 487032 attribute has a cardinality of zero or one 487034 meaning that for each instance of the MessageHeader 487008 entity there may be one ReferenceUUID 487032 attribute.

The ProductionProposal 487038 package includes a ProductionProposal 487040 entity. The ProductionProposal 487038 package includes an Activity 4870104 package.

The ProductionProposal 487040 entity has a cardinality of zero or one 487042 meaning that for each instance of the ProductionProposalByIDResponseMessage_sync 487002 entity there may be one ProductionProposal 487040 entity. The ProductionProposal 487040 entity includes various attributes, namely ID 487044, PlanningVersionID 487050, LocationInternalID 487056, ProductInternalID 487062, Quantity 487068, AvailabilityDateTime 487074 and SourceOfSupplyReference 487080.

The ID 487044 attribute is a ProductionProposalID 487048 datatype. The ID 487044 attribute has a cardinality of one 487046 meaning that for each instance of the ProductionProposal 487040 entity there is one ID 487044 attribute.

The PlanningVersionID 487050 attribute is a PlanningVersionID 487054 datatype. The PlanningVersionID 487050 attribute has a cardinality of one 487052 meaning that for each instance of the ProductionProposal 487040 entity there is one PlanningVersionID 487050 attribute.

The LocationInternalID 487056 attribute is a LocationInternalID 487060 datatype. The LocationInternalID 487056 attribute has a cardinality of one 487058 meaning that for each instance of the ProductionProposal 487040 entity there is one LocationInternalID 487056 attribute.

The ProductInternalID 487062 attribute is a ProductInternalID 487066 datatype. The ProductInternalID 487062 attribute has a cardinality of one 487064 meaning that for each instance of the ProductionProposal 487040 entity there is one ProductInternalID 487062 attribute.

The Quantity 487068 attribute is a Quantity 487072 datatype. The Quantity 487068 attribute has a cardinality of one 487070 meaning that for each instance of the ProductionProposal 487040 entity there is one Quantity 487068 attribute.

The AvailabilityDateTime 487074 attribute is a GLOBAL_DateTime 487078 datatype. The AvailabilityDateTime 487074 attribute has a cardinality of one 487076 meaning that for each instance of the ProductionProposal 487040 entity there is one AvailabilityDateTime 487074 attribute.

The SourceOfSupplyReference 487080 attribute is a SourceOfSupplyReference 487084 datatype. The SourceOfSupplyReference 487080 attribute has a cardinality of one 487082 meaning that for each instance of the ProductionProposal 487040 entity there is one SourceOfSupplyReference 487080 attribute.

The Activity 4870104 package includes an Activity 4870106 entity. The Activity 4870104 package includes various packages, namely Product 4870146 and CapacityRequirement 4870192.

The Activity 4870106 entity has a cardinality of one or n 4870108 meaning that for each instance of the ProductionProposal 487040 entity there are one or more Activity 4870106 entities. The Activity 4870106 entity includes various attributes, namely UUID 4870110, OperationActivityCategoryCode 4870116, OperationActivityCategoryName 4870122 and DateTimePeriod 4870128.

The UUID 4870110 attribute is an UUID 4870114 datatype. The UUID 4870110 attribute has a cardinality of one 4870112 meaning that for each instance of the Activity 4870106 entity there is one UUID 4870110 attribute.

The OperationActivityCategoryCode 4870116 attribute is an OperationActivityCategoryCode 4870120 datatype. The OperationActivityCategoryCode 4870116 attribute has a cardinality of one 4870118 meaning that for each instance of the Activity 4870106 entity there is one OperationActivityCategoryCode 4870116 attribute.

The OperationActivityCategoryName 4870122 attribute is a LANGUAGEINDEPENDENT_MEDIUM_Name 4870126 datatype. The OperationActivityCategoryName 4870122 attribute has a cardinality of one 4870124 meaning that for each instance of the Activity 4870106 entity there is one OperationActivityCategoryName 4870122 attribute.

The DateTimePeriod 4870128 attribute is an UPPEROPEN_GLOBAL_DateTimePeriod 4870132 datatype. The DateTimePeriod 4870128 attribute has a cardinality of one 4870130 meaning that for each instance of the Activity 4870106 entity there is one DateTimePeriod 4870128 attribute.

The Product 4870146 package includes various entities, namely OutputMaterial 4870148 and InputMaterial 4870170.

The OutputMaterial 4870148 entity has a cardinality of zero or n 4870150 meaning that for each instance of the Activity 4870106 entity there may be one or more OutputMaterial 4870148 entities. The OutputMaterial 4870148 entity includes various attributes, namely ProductInternalID 4870152, AvailabilityDateTime 4870158 and Quantity 4870164.

The ProductInternalID 4870152 attribute is a ProductInternalID 4870156 datatype. The ProductInternalID 4870152 attribute has a cardinality of one 4870154 meaning that for each instance of the OutputMaterial 4870148 entity there is one ProductInternalID 4870152 attribute.

The AvailabilityDateTime 4870158 attribute is a GLOBAL_DateTime 4870162 datatype. The AvailabilityDateTime 4870158 attribute has a cardinality of one 4870160 meaning that for each instance of the OutputMaterial 4870148 entity there is one AvailabilityDateTime 4870158 attribute.

The Quantity 4870164 attribute is a Quantity 4870168 datatype. The Quantity 4870164 attribute has a cardinality of one 4870166 meaning that for each instance of the OutputMaterial 4870148 entity there is one Quantity 4870164 attribute.

The InputMaterial 4870170 entity has a cardinality of zero or n 4870172 meaning that for each instance of the Activity 4870106 entity there may be one or more InputMaterial 4870170 entities. The InputMaterial 4870170 entity includes various attributes, namely ProductInternalID 4870174, RequirementDateTime 4870180 and Quantity 4870186.

The ProductInternalID 4870174 attribute is a ProductInternalID 4870178 datatype. The ProductInternalID 4870174 attribute has a cardinality of one 4870176 meaning that for each instance of the InputMaterial 4870170 entity there is one ProductInternalID 4870174 attribute.

The RequirementDateTime 4870180 attribute is a GLOBAL_DateTime 4870184 datatype. The RequirementDateTime 4870180 attribute has a cardinality of one 4870182 meaning that for each instance of the InputMaterial 4870170 entity there is one RequirementDateTime 4870180 attribute.

The Quantity 4870186 attribute is a Quantity 4870190 datatype. The Quantity 4870186 attribute has a cardinality of one 4870188 meaning that for each instance of the InputMaterial 4870170 entity there is one Quantity 4870186 attribute.

The CapacityRequirement 4870192 package includes a CapacityRequirement 4870194 entity.

The CapacityRequirement 4870194 entity has a cardinality of zero or n 4870196 meaning that for each instance of the Activity 4870106 entity there may be one or more CapacityRequirement 4870194 entities. The CapacityRequirement 4870194 entity includes various attributes, namely ResourceID 4870198 and Quantity 4870204.

The ResourceID 4870198 attribute is a ResourceID 4870202 datatype. The ResourceID 4870198 attribute has a cardinality of one 4870200 meaning that for each instance of the CapacityRequirement 4870194 entity there is one ResourceID 4870198 attribute.

The Quantity 4870204 attribute is a Quantity 4870208 datatype. The Quantity 4870204 attribute has a cardinality of one 4870206 meaning that for each instance of the CapacityRequirement 4870194 entity there is one Quantity 4870204 attribute.

The Log 4870210 package is a Log 4870216 datatype. The Log 4870210 package includes a Log 4870212 entity.

The Log 4870212 entity has a cardinality of one 4870214 meaning that for each instance of the ProductionProposalByIDResponseMessage_sync 487002 entity there is one Log 4870212 entity. The Log 4870212 entity includes various attributes, namely BusinessDocumentProcessingResultCode 4870218, MaximumLogItemSeverityCode 4870224 and Item 4870230.

The BusinessDocumentProcessingResultCode 4870218 attribute is a ProcessingResultCode 4870222 datatype. The BusinessDocumentProcessingResultCode 4870218 attribute has a cardinality of zero or one 4870220 meaning that for each instance of the Log 4870212 entity there may be one BusinessDocumentProcessingResultCode 4870218 attribute.

The MaximumLogItemSeverityCode 4870224 attribute is a LogItemSeverityCode 4870228 datatype. The MaximumLogItemSeverityCode 4870224 attribute has a cardinality of zero or one 4870226 meaning that for each instance of the Log 4870212 entity there may be one MaximumLogItemSeverityCode 4870224 attribute.

The Item 4870230 attribute is a LogItem 4870234 datatype. The Item 4870230 attribute has a cardinality of zero or n 4870232 meaning that for each instance of the Log 4870212 entity there may be one or more Item 4870230 attributes.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

Production Proposal

A ProductionProposal is a proposal to produce a certain quantity of a product at a location at a certain date using a certain in-house production source of supply. A ProductionProposalID is a unique identifier for a Production Proposal. In this context it refers to a Production Proposal that was selected. PlanningVersionID is a unique identifier for a Planning Version. In this context it is the identifier of the relevant Planning Version. A LocationInternalID is a proprietary identifier for a location. In this context it is the Location where production takes place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Activity Package

The Activity package groups activity relevant information.

Activity

An Activity provides detailed information about an activity. UUID is a globally unique identifier for an object. In this context it is the unique identifier for an activity of the proposal. An OperationActivityCategoryCode is a coded representation of the category of an activity within an operation. In this context it classifies the Activity. Name is a word or combination of words used to name or define an object. In this context it is the name the Activity. UPPEROPEN_GLOBAL_DateTimePeriod is a period that is defined by two points in time. These points are expressed by GLOBAL_DateTime. UPPEROPEN_GLOBAL_DateTimePeriod includes the start time-point, but excludes the end time-point. In this context it contains the start and the end time of the Activity.

Product Package

The Product package groups output material relevant information.

OutputMaterial

OutputMaterial provides detailed information about a finished product. A ProductInternalID is a proprietary identifier for a product. In this context it refers to an output material. GLOBAL_DateTime is the accurate-to-the-second time-point of a calendar day in timezone UTC. In this context it is the required availability time of the output. A Quantity is the non-monetary numerical specification of an amount in a unit of measurement. In this context it contains the volume of output.

InputMaterial

InputMaterial provides detailed information about an input material. A ProductInternalID is a proprietary identifier for a product. In this context it refers to an input material. GLOBAL_DateTime is the accurate-to-the-second time-point of a calendar day in timezone UTC. In this context it is the required availability time of the input. A Quantity is the non-monetary numerical specification of an amount in a unit of measurement. In this context it contains the volume of input.

CapacityRequirement Package

The CapacityRequirement package groups capacity requirement relevant information.

CapacityRequirement

A CapacityRequirement provides detailed information about a capacity requirement. A ResourceID is a unique identifier for a resource. In this context it is the identifier of a resource used by the activity. A Quantity is the non-monetary numerical specification of an amount in a unit of measurement. In this context it is capacity quantity required by the activity on the resource.

Log Package

A log is a sequence of messages that result when an application executes a task.

Message Data Type

The message data type ProductionProposalByElementsQueryMessage_sync 473022 of FIG. 474 contains the ProductionProposal included in the business document and the business information that is relevant for sending a business document in a message. Message data type ProductionProposalByElementsQueryMessage_sync 473022 includes entity ProductionProposalByElementsQueryMessage_sync 474004 and packages MessageHeader 474008 and Selection 474018.

FIGS. 484-1 through 484-11 show a ProductionProposalByElementsQueryMessage_sync 484000 package. The ProductionProposalByElementsQueryMessage_sync 484000 package is a ProductionProposalByElementsQueryMessage_sync 484004 datatype. The ProductionProposalByElementsQueryMessage_sync 484000 package includes a ProductionProposalByElementsQueryMessage_sync 484002 entity. The ProductionProposalByElementsQueryMessage_sync 484000 package includes various packages, namely MessageHeader 484006 and Selection 4840116.

The MessageHeader 484006 package is a BusinessDocumentMessageHeader 484012 datatype. The MessageHeader 484006 package includes a MessageHeader 484008 entity.

The MessageHeader 484008 entity has a cardinality of one 484010 meaning that for each instance of the ProductionProposalByElementsQueryMessage_sync 484002 entity there is one MessageHeader 484008 entity. The MessageHeader 484008 entity includes various attributes, namely ID 484014, ReferenceID 484020, CreationDateTime 484026, TestDataIndicator 484032, ReconciliationIndicator 484038 and SenderParty 484044.

The ID 484014 attribute is a BusinessDocumentMessageID 484018 datatype. The ID 484014 attribute has a cardinality of one 484016 meaning that for each instance of the MessageHeader 484008 entity there is one ID 484014 attribute.

The ReferenceID 484020 attribute is a BusinessDocumentMessageID 484024 datatype. The ReferenceID 484020 attribute has a cardinality of zero or one 484022 meaning that for each instance of the MessageHeader 484008 entity there may be one ReferenceID 484020 attribute.

The CreationDateTime 484026 attribute is a GLOBAL_DateTime 484030 datatype. The CreationDateTime 484026 attribute has a cardinality of one 484028 meaning that for each instance of the MessageHeader 484008 entity there is one CreationDateTime 484026 attribute.

The TestDataIndicator 484032 attribute is an Indicator 484036 datatype. The TestDataIndicator 484032 attribute has a cardinality of zero or one 484034 meaning that for each instance of the MessageHeader 484008 entity there may be one TestDataIndicator 484032 attribute.

The ReconciliationIndicator 484038 attribute is an Indicator 484042 datatype. The ReconciliationIndicator 484038 attribute has a cardinality of zero or one 484040 meaning that for each instance of the MessageHeader 484008 entity there may be one ReconciliationIndicator 484038 attribute.

The SenderParty 484044 attribute is a BusinessDocumentMessageHeaderParty 484048 datatype. The SenderParty 484044 attribute has a cardinality of zero or one 484046 meaning that for each instance of the MessageHeader 484008 entity there may be one SenderParty 484044 attribute.

The Selection 4840116 package includes a ProductionProposalSelectionByElements 4840118 entity.

The ProductionProposalSelectionByElements 4840118 entity has a cardinality of one 4840120 meaning that for each instance of the ProductionProposalByElementsQueryMessage_sync 484002 entity there is one ProductionProposalSelectionByElements 4840118 entity. The ProductionProposalSelectionByElements 4840118 entity includes a PlanningVersionID 4840122 attribute. The ProductionProposalSelectionByElements 4840118 entity has various subordinate entities, namely SelectionByLocationInternalID 4840128, SelectionByProductInternalID 4840156, SelectionBySourceOfSupplyReference 4840184, DateTimePeriod 4840236, FixedIndicator 4840254 and MaximumNumberValue 4840260.

The PlanningVersionID 4840122 attribute is a PlanningVersionID 4840126 datatype. The PlanningVersionID 4840122 attribute has a cardinality of one 4840124 meaning that for each instance of the ProductionProposalSelectionByElements 4840118 entity there is one PlanningVersionID 4840122 attribute.

The SelectionByLocationInternalID 4840128 entity has a cardinality of zero or n 4840130 meaning that for each instance of the ProductionProposalSelectionByElements 4840118 entity there may be one or more SelectionByLocationInternalID 4840128 entities. The SelectionByLocationInternalID 4840128 entity includes various attributes, namely InclusionExclusionCode 4840132, IntervalBoundaryTypeCode 4840138, LowerBoundaryLocationInternalID 4840144 and UpperBoundaryLocationInternalID 4840150.

The InclusionExclusionCode 4840132 attribute is an InclusionExclusionCode 4840136 datatype. The InclusionExclusionCode 4840132 attribute has a cardinality of zero or one 4840134 meaning that for each instance of the SelectionByLocationInternalID 4840128 entity there may be one InclusionExclusionCode 4840132 attribute.

The IntervalBoundaryTypeCode 4840138 attribute is an IntervalBoundaryTypeCode 4840142 datatype. The IntervalBoundaryTypeCode 4840138 attribute has a cardinality of one 4840140 meaning that for each instance of the SelectionByLocationInternalID 4840128 entity there is one IntervalBoundaryTypeCode 4840138 attribute.

The LowerBoundaryLocationInternalID 4840144 attribute is a LocationInternalID 4840148 datatype. The LowerBoundaryLocationInternalID 4840144 attribute has a cardinality of zero or one 4840146 meaning that for each instance of the SelectionByLocationInternalID 4840128 entity there may be one LowerBoundaryLocationInternalID 4840144 attribute.

The UpperBoundaryLocationInternalID 4840150 attribute is a LocationInternalID 4840154 datatype. The UpperBoundaryLocationInternalID 4840150 attribute has a cardinality of zero or one 4840152 meaning that for each instance of the SelectionByLocationInternalID 4840128 entity there may be one UpperBoundaryLocationInternalID 4840150 attribute.

The SelectionByProductInternalID 4840156 entity has a cardinality of zero or n 4840158 meaning that for each instance of the ProductionProposalSelectionByElements 4840118 entity there may be one or more SelectionByProductInternalID 4840156 entities. The SelectionByProductInternalID 4840156 entity includes various attributes, namely InclusionExclusionCode 4840160, IntervalBoundaryTypeCode 4840166, LowerBoundaryProductInternalID 4840172 and UpperBoundaryProductInternalID 4840178.

The InclusionExclusionCode 4840160 attribute is an InclusionExclusionCode 4840164 datatype. The InclusionExclusionCode 4840160 attribute has a cardinality of zero or one 4840162 meaning that for each instance of the SelectionByProductInternalID 4840156 entity there may be one InclusionExclusionCode 4840160 attribute.

The IntervalBoundaryTypeCode 4840166 attribute is an IntervalBoundaryTypeCode 4840170 datatype. The IntervalBoundaryTypeCode 4840166 attribute has a cardinality of one 4840168 meaning that for each instance of the SelectionByProductInternalID 4840156 entity there is one IntervalBoundaryTypeCode 4840166 attribute.

The LowerBoundaryProductInternalID 4840172 attribute is a ProductInternalID 4840176 datatype. The LowerBoundaryProductInternalID 4840172 attribute has a cardinality of zero or one 4840174 meaning that for each instance of the SelectionByProductInternalID 4840156 entity there may be one LowerBoundaryProductInternalID 4840172 attribute.

The UpperBoundaryProductInternalID 4840178 attribute is a ProductInternalID 4840182 datatype. The UpperBoundaryProductInternalID 4840178 attribute has a cardinality of zero or one 4840180 meaning that for each instance of the SelectionByProductInternalID 4840156 entity there may be one UpperBoundaryProductInternalID 4840178 attribute.

The SelectionBySourceOfSupplyReference 4840184 entity has a cardinality of zero or n 4840186 meaning that for each instance of the ProductionProposalSelectionByElements 4840118 entity there may be one or more SelectionBySourceOfSupplyReference 4840184 entities. The SelectionBySourceOfSupplyReference 4840184 entity includes various attributes, namely InclusionExclusionCode 4840188, IntervalBoundaryTypeCode 4840194 and LowerBoundarySourceOfSupplyReference 4840200.

The InclusionExclusionCode 4840188 attribute is an InclusionExclusionCode 4840192 datatype. The InclusionExclusionCode 4840188 attribute has a cardinality of zero or one 4840190 meaning that for each instance of the SelectionBySourceOfSupplyReference 4840184 entity there may be one InclusionExclusionCode 4840188 attribute.

The IntervalBoundaryTypeCode 4840194 attribute is an IntervalBoundaryTypeCode 4840198 datatype. The IntervalBoundaryTypeCode 4840194 attribute has a cardinality of one 4840196 meaning that for each instance of the SelectionBySourceOfSupplyReference 4840184 entity there is one IntervalBoundaryTypeCode 4840194 attribute.

The LowerBoundarySourceOfSupplyReference 4840200 attribute is a SourceOfSupplyReference 4840204 datatype. The LowerBoundarySourceOfSupplyReference 4840200 attribute has a cardinality of zero or one 4840202 meaning that for each instance of the SelectionBySourceOfSupplyReference 4840184 entity there may be one LowerBoundarySourceOfSupplyReference 4840200 attribute.

The DateTimePeriod 4840236 entity has a cardinality of one 4840238 meaning that for each instance of the ProductionProposalSelectionByElements 4840118 entity there is one DateTimePeriod 4840236 entity. The DateTimePeriod 4840236 entity includes various attributes, namely StartDateTime 4840242 and EndDateTime 4840248.

The StartDateTime 4840242 attribute is a DateTime 4840246 datatype. The StartDateTime 4840242 attribute has a cardinality of zero or one 4840244 meaning that for each instance of the DateTimePeriod 4840236 entity there may be one StartDateTime 4840242 attribute.

The EndDateTime 4840248 attribute is a DateTime 4840252 datatype. The EndDateTime 4840248 attribute has a cardinality of zero or one 4840250 meaning that for each instance of the DateTimePeriod 4840236 entity there may be one EndDateTime 4840248 attribute.

The FixedIndicator 4840254 entity has a cardinality of zero or one 4840256 meaning that for each instance of the ProductionProposalSelectionByElements 4840118 entity there may be one FixedIndicator 4840254 entity.

The MaximumNumberValue 4840260 entity has a cardinality of zero or one 4840262 meaning that for each instance of the ProductionProposalSelectionByElements 4840118 entity there may be one MaximumNumberValue 4840260 entity.

MessageHeader Package

MessageHeader package 474008 groups the business information that is relevant for sending a business document in a message. MessageHeader package 474008 includes MessageHeader entity 474006.

MessageHeader

MessageHeader entity 474006 groups business information from the perspective of the sending application, for example, information to identify the business document in a message, information about the sender, and (possibly) information about the recipient. The consumer is recommended not to populate TestDataIndicator and ReconciliationIndicator since these elements are ignored in this stage of development. The BusinessScopeBusinessProcess is used to transfer the Supply Planning Simulation ID.

Selection Package

Selection package 474018 includes entities ProductionProposalSelectionByElements 474010, SelectionByLocationInternalID 474012, SelectionByProductInternalID 474014, and SelectionBySourceOfSupplyReference 474016. This enables querying of production proposal(s) in the Supply and Demand Matching.

ProductionProposalSelectionByElements

ProductionProposalSelectionByElements entity 474010 contains the elements of production proposal(s); production proposal(s) can be queried by these selection values. PlanningVersionID is a unique identifier for a PlanningVersion. In this context, it is the identifier of the relevant Planning Version. DateTimePeriod is a period that is defined by two points in time. These points are expressed by GLOBAL_DateTime. UPPEROPEN_GLOBAL_DateTimePeriod includes the start time-point, but excludes the end time-point. In this context, it contains the start and the end time of selection horizon. FixedIndicator (optional) indicates whether a value/object is fixed or not. In this context, it represents a selection condition for proposal confirmation status. MaximumNumberValue (optional) is a number. In this context, it indicates the maximum number of production proposals to be returned out of query results. Selected production proposals are sorted and returned by ProductionProposalID. The query will result the following production proposals: proposal shall belong to the given Planning Version, proposal shall be within the selection time horizon, proposal shall produce a given Product or shall take place in a given Location, if FixedIndicator is filled: proposal shall share the same FixedIndicator status, and if SelectionBySourceOfSupply is filled the proposal shall use a given SourceOfSupply.

ProductionProposalSelectionByLocationInternalID

SelectionByLocationInternalID entity 474012 provides information about selection conditions regarding LocationInternalID. InclusionExclusionCode (optional) is a coded representation of the inclusion of a set into a result or the exclusion of it. In this context, it represents the inclusion or exclusion relation of selection range to query results. IntervalBoundaryTypeCode is a coded representation of an interval boundary type. In this context, it defines the meaning of range boundaries in LowerBoundary and UpperBoundary. LowerBoundaryLocationInternalID (optional) is a proprietary identifier for a location. In this context, it represents a selection condition for location. UpperBoundaryLocationInternalID (optional) is a proprietary identifier for a location. In this context, it represents a selection condition for location. In the current stage of development, “Single Value” IntervalBoundaryTypeCodes can be served.

ProductionProposalSelectionByProductInternalID

SelectionByProductInternalID entity 474014 provides information about selection conditions regarding ProductInternalID. InclusionExclusionCode (optional) is a coded representation of the inclusion of a set into a result or the exclusion of it. In this context, it represents the inclusion or exclusion relation of selection range to query results. IntervalBoundaryTypeCode is a coded representation of an interval boundary type. In this context, it defines the meaning of range boundaries in LowerBoundary and UpperBoundary. LowerBoundaryProductInternalID (optional) is a proprietary identifier for a product. In this context, it represents a selection condition for material. UpperBoundaryProductInternalID (optional) is a proprietary identifier for a product. In this context, it represents a selection condition for material. In the current stage of development “Single Value” IntervalBoundaryTypeCodes can be served.

ProductionProposalSelectionBySourceOfSupplyReference

SelectionBySourceOfSupplyReference entity 474016 provides information about selection conditions regarding SourceOfSupplyReference. InclusionExclusionCode (optional) is a coded representation of the inclusion of a set into a result or the exclusion of it. In this context it represents the inclusion or exclusion relation of selection range to query results. An IntervalBoundaryTypeCode is a coded representation of an interval boundary type. In this context, it defines the meaning of range boundaries in LowerBoundary and UpperBoundary. LowerBoundarySourceOfSupplyReference (optional) is a unique reference to a source of supply or to a LogisticRelationship within a source of supply. In this context, it represents a selection condition for source of supply. UpperBoundarySourceOfSupplyReference (optional) is a unique reference to a source of supply or to a LogisticRelationship within a source of supply. In this context it represents a selection condition for source of supply. In the current stage of development, "Single Value" IntervalBoundaryTypeCodes can be served.

Message Data Type

The message data type ProductionProposalByElementsResponseMessage_sync contains the ProductionProposal included in the business document and the business information that is relevant for sending a business document in a message.

FIGS. 485-1 through 485-8 show a ProductionProposalByElementsResponseMessage_sync 485000 package. The ProductionProposalByElementsResponseMessage_sync 485000 package is a ProductionProposalByElementsResponseMessage_sync 485004 datatype. The ProductionProposalByElementsResponseMessage_sync 485000 package includes a ProductionProposalByElementsResponseMessage_sync 485002 entity. The ProductionProposalByElementsResponseMessage_sync 485000 package includes various packages, namely MessageHeader 485006, ProductionProposal 485038 and Log 4850210.

The MessageHeader 485006 package is a BasicBusinessDocumentMessageHeader 485012 datatype. The MessageHeader 485006 package includes a MessageHeader 485008 entity.

The MessageHeader 485008 entity has a cardinality of one 485010 meaning that for each instance of the ProductionProposalByElementsResponseMessage_sync 485002 entity there is one MessageHeader 485008 entity. The MessageHeader 485008 entity includes various attributes, namely ID 485014, UUID 485020, ReferenceID 485026 and ReferenceUUID 485032.

The ID 485014 attribute is a BusinessDocumentMessageID 485018 datatype. The ID 485014 attribute has a cardinality of zero or one 485016 meaning that for each instance of the MessageHeader 485008 entity there may be one ID 485014 attribute.

The UUID 485020 attribute is an ATTRIBUTEINDEPENDENT_UUID 485024 datatype. The UUID 485020 attribute has a cardinality of zero or one 485022 meaning that for each instance of the MessageHeader 485008 entity there may be one UUID 485020 attribute.

The ReferenceID 485026 attribute is a BusinessDocumentMessageID 485030 datatype. The ReferenceID 485026 attribute has a cardinality of zero or one 485028 meaning that for each instance of the MessageHeader 485008 entity there may be one ReferenceID 485026 attribute.

The ReferenceUUID 485032 attribute is an ATTRIBUTEINDEPENDENT_UUID 485036 datatype. The ReferenceUUID 485032 attribute has a cardinality of zero or one 485034 meaning that for each instance of the MessageHeader 485008 entity there may be one ReferenceUUID 485032 attribute.

The ProductionProposal 485038 package includes a ProductionProposal 485040 entity. The ProductionProposal 485038 package includes an Activity 4850104 package.

The ProductionProposal 485040 entity has a cardinality of zero or n 485042 meaning that for each instance of the ProductionProposalByElementsResponseMessage_sync 485002 entity there may be one or more ProductionProposal 485040 entities. The ProductionProposal 485040 entity includes various attributes, namely ID 485044, PlanningVersionID 485050, LocationInternalID 485056, ProductInternalID 485062, Quantity 485068, AvailabilityDateTime 485074 and SourceOfSupplyReference 485080.

The ID 485044 attribute is a ProductionProposalID 485048 datatype. The ID 485044 attribute has a cardinality of one 485046 meaning that for each instance of the ProductionProposal 485040 entity there is one ID 485044 attribute.

The PlanningVersionID 485050 attribute is a PlanningVersionID 485054 datatype. The PlanningVersionID 485050 attribute has a cardinality of one 485052 meaning that for each instance of the ProductionProposal 485040 entity there is one PlanningVersionID 485050 attribute.

The LocationInternalID 485056 attribute is a LocationInternalID 485060 datatype. The LocationInternalID 485056 attribute has a cardinality of one 485058 meaning that for each instance of the ProductionProposal 485040 entity there is one LocationInternalID 485056 attribute.

The ProductInternalID 485062 attribute is a ProductInternalID 485066 datatype. The ProductInternalID 485062 attribute has a cardinality of one 485064 meaning that for each instance of the ProductionProposal 485040 entity there is one ProductInternalID 485062 attribute.

The Quantity 485068 attribute is a Quantity 485072 datatype. The Quantity 485068 attribute has a cardinality of one 485070 meaning that for each instance of the ProductionProposal 485040 entity there is one Quantity 485068 attribute.

The AvailabilityDateTime 485074 attribute is a GLOBAL_DateTime 485078 datatype. The AvailabilityDateTime 485074 attribute has a cardinality of one 485076 meaning that for each instance of the ProductionProposal 485040 entity there is one AvailabilityDateTime 485074 attribute.

The SourceOfSupplyReference 485080 attribute is a SourceOfSupplyReference 485084 datatype. The SourceOfSupplyReference 485080 attribute has a cardinality of one 485082 meaning that for each instance of the ProductionProposal 485040 entity there is one SourceOfSupplyReference 485080 attribute.

The Activity 4850104 package includes an Activity 4850106 entity. The Activity 4850104 package includes various packages, namely Product 4850146 and CapacityRequirement 4850192.

The Activity 4850106 entity has a cardinality of one or n 4850108 meaning that for each instance of the ProductionProposal 485040 entity there are one or more Activity 4850106 entities. The Activity 4850106 entity includes various attributes, namely UUID 4850110, OperationActivityCategoryCode 4850116, OperationActivityCategoryName 4850122 and DateTimePeriod 4850128.

The UUID 4850110 attribute is an UUID 4850114 datatype. The UUID 4850110 attribute has a cardinality of one 4850112 meaning that for each instance of the Activity 4850106 entity there is one UUID 4850110 attribute.

The OperationActivityCategoryCode 4850116 attribute is an OperationActivityCategoryCode 4850120 datatype. The OperationActivityCategoryCode 4850116 attribute has a cardinality of one 4850118 meaning that for each instance of the Activity 4850106 entity there is one OperationActivityCategoryCode 4850116 attribute.

The OperationActivityCategoryName 4850122 attribute is a LANGUAGEINDEPENDENT_MEDIUM_Name 4850126 datatype. The OperationActivityCategoryName 4850122 attribute has a cardinality of one 4850124 meaning that for each instance of the Activity 4850106 entity there is one OperationActivityCategoryName 4850122 attribute.

The DateTimePeriod 4850128 attribute is an UPPEROPEN_GLOBAL_DateTimePeriod 4850132 datatype. The DateTimePeriod 4850128 attribute has a cardinality of one 4850130 meaning that for each instance of the Activity 4850106 entity there is one DateTimePeriod 4850128 attribute.

The Product 4850146 package includes various entities, namely OutputMaterial 4850148 and InputMaterial 4850170.

The OutputMaterial 4850148 entity has a cardinality of zero or n 4850150 meaning that for each instance of the Activity 4850106 entity there may be one or more OutputMaterial 4850148 entities. The OutputMaterial 4850148 entity includes various attributes, namely ProductInternalID 4850152, AvailabilityDateTime 4850158 and Quantity 4850164.

The ProductInternalID 4850152 attribute is a ProductInternalID 4850156 datatype. The ProductInternalID 4850152 attribute has a cardinality of one 4850154 meaning that for each instance of the OutputMaterial 4850148 entity there is one ProductInternalID 4850152 attribute.

The AvailabilityDateTime 4850158 attribute is a GLOBAL_DateTime 4850162 datatype. The AvailabilityDateTime 4850158 attribute has a cardinality of one 4850160 meaning that for each instance of the OutputMaterial 4850148 entity there is one AvailabilityDateTime 4850158 attribute.

The Quantity 4850164 attribute is a Quantity 4850168 datatype. The Quantity 4850164 attribute has a cardinality of one 4850166 meaning that for each instance of the OutputMaterial 4850148 entity there is one Quantity 4850164 attribute.

The InputMaterial 4850170 entity has a cardinality of zero or n 4850172 meaning that for each instance of the Activity 4850106 entity there may be one or more InputMaterial 4850170 entities. The InputMaterial 4850170 entity includes various attributes, namely ProductInternalID 4850174, RequirementDateTime 4850180 and Quantity 4850186.

The ProductInternalID 4850174 attribute is a ProductInternalID 4850178 datatype. The ProductInternalID 4850174 attribute has a cardinality of one 4850176 meaning that for each instance of the InputMaterial 4850170 entity there is one ProductInternalID 4850174 attribute.

The RequirementDateTime 4850180 attribute is a GLOBAL_DateTime 4850184 datatype. The RequirementDateTime 4850180 attribute has a cardinality of one 4850182 meaning that for each instance of the InputMaterial 4850170 entity there is one RequirementDateTime 4850180 attribute.

The Quantity 4850186 attribute is a Quantity 4850190 datatype. The Quantity 4850186 attribute has a cardinality of one 4850188 meaning that for each instance of the InputMaterial 4850170 entity there is one Quantity 4850186 attribute.

The CapacityRequirement 4850192 package includes a CapacityRequirement 4850194 entity.

The CapacityRequirement 4850194 entity has a cardinality of zero or n 4850196 meaning that for each instance of the Activity 4850106 entity there may be one or more CapacityRequirement 4850194 entities. The CapacityRequirement 4850194 entity includes various attributes, namely ResourceID 4850198 and Quantity 4850204.

The ResourceID 4850198 attribute is a ResourceID 4850202 datatype. The ResourceID 4850198 attribute has a cardinality of one 4850200 meaning that for each instance of the CapacityRequirement 4850194 entity there is one ResourceID 4850198 attribute.

The Quantity 4850204 attribute is a Quantity 4850208 datatype. The Quantity 4850204 attribute has a cardinality of one 4850206 meaning that for each instance of the CapacityRequirement 4850194 entity there is one Quantity 4850204 attribute.

The Log 4850210 package is a Log 4850216 datatype. The Log 4850210 package includes a Log 4850212 entity.

The Log 4850212 entity has a cardinality of one 4850214 meaning that for each instance of the ProductionProposalByElementsResponseMessage_sync 485002 entity there is one Log 4850212 entity. The Log 4850212 entity includes various attributes, namely BusinessDocumentProcessingResultCode 4850218, MaximumLogItemSeverityCode 4850224 and Item 4850230.

The BusinessDocumentProcessingResultCode 4850218 attribute is a ProcessingResultCode 4850222 datatype. The BusinessDocumentProcessingResultCode 4850218 attribute has a cardinality of zero or one 4850220 meaning that for each instance of the Log 4850212 entity there may be one BusinessDocumentProcessingResultCode 4850218 attribute.

The MaximumLogItemSeverityCode 4850224 attribute is a LogItemSeverityCode 4850228 datatype. The MaximumLogItemSeverityCode 4850224 attribute has a cardinality of zero or one 4850226 meaning that for each instance of the Log 4850212 entity there may be one MaximumLogItemSeverityCode 4850224 attribute.

The Item 4850230 attribute is a LogItem 4850234 datatype. The Item 4850230 attribute has a cardinality of zero or n 4850232 meaning that for each instance of the Log 4850212 entity there may be one or more Item 4850230 attributes.

MessageHeader Package

A MessageHeader package groups the business information that is relevant for sending a business document in a message.

MessageHeader

A MessageHeader groups business information from the perspective of the sending application, such as information to identify the business document in a message, information about the sender, and possibly information about the recipient. For all Request or Query message data types it is of type GDT: BusinessDocumentMessageHeader, whereby the following elements of the GDT are used: ID or UUID, CreationDateTime, and BusinessScopeBusinessProcess. For all Confirmation or Response message data types it is of type BasicBusinessDocumentMessageHeader, whereby the following elements of the GDT are used: ReferenceID or ReferenceUUID. The consumer is recommended not to populate TestDataIndicator and ReconciliationIndicator since these elements are ignored in this stage of development. The BusinessScopeBusinessProcess is used to transfer the Supply Planning Simulation ID.

ProductionProposal Package

The ProductionProposal package groups the Production Proposal relevant information.

ProductionProposal

A ProductionProposal is a proposal to produce a certain quantity of a product at a location at a certain date using a certain in-house production source of supply. A ProductionProposalID is a unique identifier for a Production Proposal. In this context it refers to the Production Proposal. PlanningVersionID is a unique identifier for a Planning Version. In this context it is the identifier of the relevant Planning Version. A LocationInternalID is a proprietary identifier for a location. In this context it is the Location where production takes place. A ProductInternalID is a proprietary identifier for a product. In this context it is the requested output of the Production Proposal. A Quantity is the non-monetary numerical specification of an amount in a unit of measurement. In this context it contains the volume of production. GLOBAL_DateTime is the accurate-to-the-second time-point of a calendar day in timezone UTC. In this context it is the required availability time of the requested output. A SourceOfSupplyReference is a unique reference to a source of supply or to a LogisticRelationship within a source of supply. In this context it refers to an InternalProductionSupply that is the requested way of production. A FixedIndicator indicates whether a value/object is fixed or not. In this context it indicates the confirmed status of the proposal. A fixed proposal shall be considered as a constraint and can not be overridden by some planning logics.

Log Package

A log is a sequence of messages that result when an application executes a task.

Project Interfaces

Project services help planning, analyzing, controlling and monitoring schedules, dates, and resources (such as personnel, machines, materials) in a project. A project stakeholder (such as a project manager) requests a change to an existing project and its tasks (such as project scope, time, budget or planned effort).

Message Choreography

The message choreography of FIG. 494 describes a possible logical sequence of messages that can be used to realize a project messaging business scenario.

A ProjectWorkBreakdownStructureElementByWorkBreakdownStructureElementIDQuery_sync is an inquiry to project processing for description of project work breakdown structure element that match the given selection criteria. The structure of the message type ProjectWorkBreakdownStructureElementByWorkBreakdownStructureElementIDQuery_sync is specified by the message data type ProjectWorkBreakdownStructureElementByWorkBreakdownStructureElementIDQueryMessage_sync.

A ProjectWorkBreakdownStructureElementByWorkBreakdownStructureElementIDResponse_sync is a response from project processing to a ProjectWorkBreakdownStructureElementByWorkBreakdownStructureElementIDQuery_sync. The structure of the message type ProjectWorkBreakdownStructureElementByWorkBreakdownStructureElementIDResponse_sync is specified by the message data type ProjectWorkBreakdownStructureElementByWorkBreakdownStructureElementIDResponse Message_sync which is derived from the message data type ProjectMessage_sync.

A ProjectActivityChangeRequest_sync is a request to change a project activity in project processing. The structure of the message type ProjectActivityChangeRequest_sync is specified by the message data type ProjectActivityChangeRequestMessage_sync which is derived from the message data type ProjectMessage_sync.

A ProjectActivityChangeConfirmation_sync is a confirmation from project processing to a ProjectActivityChangeRequest_sync. The structure of the message type ProjectActivityChangeConfirmation_sync is specified by the message data type ProjectActivityChangeConfirmationMessage_sync which is derived from the message data type ProjectMessage_sync.

A ProjectActivityChangeCheckQuery_sync is an inquiry to project processing to check whether the change operation ProjectActivityChangeRequest_sync is possible. The structure of the message type ProjectActivityChangeCheckQuery_sync is specified by the message data type ProjectActivityChangeCheckQueryMessage_sync which is derived from the message data type ProjectMessage_sync.

A ProjectActivityChangeCheckResponse_sync is a response from project processing to ProjectActivityChangeCheckQuery_sync. The structure of the message type ProjectActivityChangeCheckResponse_sync is specified by the message data type ProjectActivityChangeCheckResponseMessage_sync, which is derived from the message data type ProjectMessage_sync.

A ProjectActivityByActivityIDQuery_sync is an inquiry to project processing for description of project activity that match the given selection criteria. The structure of the message type ProjectActivityByActivityIDQuery_sync is specified by the message data type ProjectActivityByActivityIDQueryMessage_sync.

A ProjectActivityByActivityIDResponse_sync is a response from project processing to a ProjectActivityByActivityIDQuery_sync. The structure of the message type ProjectActivityByActivityIDResponse_sync is specified by the message data type ProjectActivityByActivityIDResponseMessage_sync which is derived from the message data type ProjectMessage_sync.

A ProjectActivityByWorkBreakdownStructureElementIDQuery_sync is an inquiry to project processing for description of project activity that match the given selection criteria. The structure of the message type ProjectActivityByWorkBreakdownStructureElementIDQuery_sync is specified by the message data type ProjectActivityByWorkBreakdownStructureElementIDQueryMessage_sync.

A ProjectActivityByWorkBreakdownStructureElementIDResponse_sync is a response from project processing to a ProjectActivityByWorkBreakdownStructureElementIDQuery_sync. The structure of the message type ProjectActivityByWorkBreakdownStructureElementIDResponse__sync is specified by the message data type ProjectActivityByWorkBreakdownStructureElementIDResponseMessage_sync, which is derived from the message data type ProjectMessage_sync.

A ProjectDescriptionByIDQuery_sync is an inquiry to project processing for description of project that match the given selection criteria. The structure of the message type ProjectDescriptionByIDQuery_sync is specified by the message data type ProjectDescriptionByIDQueryMessage_sync.

A ProjectDescriptionByIDResponse_sync is a response from project processing to a ProjectDescriptionByIDQuery_sync. The structure of the message type ProjectDescriptionByIDResponse_sync is specified by the message data type ProjectDescriptionByIDResponseMessage_sync which is derived from the message data type ProjectMessage_sync.

A ProjectWorkBreakdownStructureElementByIDQuery_sync is an inquiry to project processing for project work breakdown structure element for a given project ID. The structure of the message type ProjectBreakdownStructureElementByIDQuery_sync is specified by the message data type ProjectWorkBreakdownStructureElementByIDQueryMessage_sync.

A ProjectWorkBreakdownStructureElementByIDResponse_sync is a response from project processing to a ProjectWorkBreakdownStructureElementByIDQuery_sync. The structure of the message type ProjectWorkBreakdownStructureElementByIDResponse_sync is specified by the message data type ProjectWorkBreakdownStructureElementByIDResponseMessage_sync, which is derived from the message data type ProjectMessage_sync.

A ProjectPartyByIDAndPartyRoleCodeQuery_sync is an inquiry to project processing for project for a given project ID and role code. The structure of the message type ProjectPartyByIDAndPartyRoleCodeQuery_sync is specified by the message data type ProjectPartyByIDAndPartyRoleCodeQueryMessage_sync.

A ProjectPartyByIDAndPartyRoleCodeResponse_sync is a response from project processing to a ProjectPartyByIDAndPartyRoleCodeQuery_sync. The structure of the message type ProjectPartyByIDAndPartyRoleCodeResponse_sync is specified by the message data type ProjectPartyByIDAndPartyRoleCodeResponseMessage_sync, which is derived from the message data type ProjectMessage_sync.

A ProjectByPartyQuery_sync is an inquiry to project processing for a given Participate ID and role code. The structure of the message type ProjectByPartyQuery_sync is specified by the message data type ProjectByPartyQueryMessage_sync._sync.

A ProjectByPartyResponse_sync is a response from project processing to a ProjectByPartyQuery_sync. The structure of the message type ProjectByPartyResponse_sync is specified by the message data type ProjectByPartyResponseMessage_sync, which is derived from the message data type ProjectMessage_sync.

A ProjectWorkBreakdownStructureElementAttachmentByWorkBreakdownStructureElementIDQuery_sync is an inquiry to project processing for identifying elements of attachment matching the selection criteria. The structure of the message type ProjectWorkBreakdownStructureElementAttachmentByWorkBreakdownStructureElementIDQuery_sync is specified by the message data type ProjectWorkBreakdownStructureElementAttachmentByWorkBreakdownStructureElementIDQuery Message_sync, which is derived from the message data type ProjectMessage_sync.

A ProjectWorkBreakdownStructureElementAttachmentByWorkBreakdownStructureElementIDResponse_sync is a response from project processing to a ProjectWorkBreakdownStructureElementAttachmentByWorkBreakdownStructureElementIDQuery_sync. The structure of the message type ProjectWorkBreakdownStructureElementAttachmentByWorkBreakdownStructureElementIDResponse is specified by the message data type ProjectWorkBreakdownStructureElementAttachmentByWorkBreakdownStructureElementIDResponseMessage, which is derived from the message data type ProjectMessage_sync.

A ProjectActivityAttachmentByActivityIDAndNetworkIDQuery_sync is an inquiry to project processing for identifying the elements of attachment that match the given selection criteria. The structure of the message type ProjectActivityAttachmentByActivityIDAndNetworkIDQuery_sync is specified by the message data type ProjectActivityAttachmentByActivityIDAndNetworkIDQueryMessage_sync.

A ProjectActivityAttachmentByActivityIDAndNetworkIDResponse_sync is a response from project processing to a ProjectActivityAttachmentByActivityIDAndNetworkIDQuery_sync. The structure of the message type ProjectActivityAttachmentByActivityIDAndNetworkIDResponse_sync is specified by the message data type ProjectActivityAttachmentByActivityIDAndNetworkIDResponseMessage_sync, which is derived from the message data type ProjectMessage_sync.

For example, a "Consumer" system 494002 can make a project activity change request using the ProjectActivityChangeRequest_sync message 494006 as shown, for example, in FIG. 504. A "Project Processing" system 494004 can confirm the change request using the ProjectActivityChangeConfirmation_sync message 494008 as shown, for example, in FIGURE YCHBK.

The "Consumer" system 494002 can query the project activity change using the ProjectActivity ChangeCheckQuery_sync 494010 as shown, for example, in FIG. 501. The "Project Processing" system 494004 can respond to the query using the ProjectActivityChangeCheckResponseMessage_sync message 494012 for example, in FIG. 502.

The "Consumer" system 494002 can query for project activity by work breakdown structure element ID using the ProjectActivityByWorkBreakdownstructureElementIDQueryMessage_sync 494014 as shown, for example, in FIG. 499. The "Project Processing" system 494004 can respond using the ProjectActivityByWorkBreakdownstructureElementIDResponseMessage_sync message 494016 as shown, for example, in FIG. 500.

The "Consumer" system 494002 can send a project work breakdown structure element by work breakdown structure element ID message using the ProjectWorkBreakdownStructureElementByWorkBreakdownStructureElementIDQueryMessage_sync 494018 as shown, for example, in FIG. 515. The "Project Processing" system 494004 can respond using the ProjectWorkBreakdownStructureElementByWorkBreakdownStructureElementIDResponse Message_sync message 494020 as shown, for example, in FIG. 516.

The "Consumer" system 494002 can query for project activity by activity ID using the ProjectActivityByActivityIDQuery_sync 494022 as shown, for example, in FIG. 497. The "Project Processing" system 494004 can respond using the ProjectActivityByActivityIDResponseMessage_sync message 494024 as shown, for example, in FIG. 498.

The "Consumer" system 494002 can make a project work breakdown structure element by ID query using the ProjectWorkBreakdownStructureElementByIDQueryMessage_sync 494026 as shown, for example, in FIG. 513. The "Project Processing" system 494004 can respond using the ProjectWorkBreakdownStructureElementByIDResponseMessage_sync message 494028 as shown, for example, in FIG. 514.

The "Consumer" system 494002 can query for project description by ID using the ProjectDescriptionByIDQueryMessage_sync 494030 as shown, for example, in FIG. 507. The "Project Processing" system 494004 can respond using the ProjectDescriptionByIDResponseMessage_sync message 494032 as shown, for example, in FIG. 508.

The "Consumer" system 494002 can make a project work breakdown structure element attachment by work breakdown structure element ID query using the ProjectWorkBreakdownStructureElementAttachmentByWorkBreakdownStructure ElementIDQueryMessage_sync 494034 as shown, for example, in FIG. 511. The "Project Processing" system 494004 can respond using the ProjectWorkBreakdownStructureElementAttachmentByWorkBreakdownStructureElementIDResponseMessage_sync message 494036 as shown, for example, in FIG. 512.

The "Consumer" system 494002 can make a project activity attachment by activity ID and network ID query using the ProjectActivityAttachmentByActivityIDAndNetworkIDQueryMessage_sync 494038 as shown, for example, in FIG. 495. The "Project Processing" system 494004 can respond using the ProjectActivityAttachmentByActivityIDAndNetworkIDResponseMessage_sync message 494040 as shown, for example, in FIG. 496.

The "Consumer" system 494002 can make a project by party query using the ProjectByPartyQueryMessage_sync 494042 as shown, for example, in FIG. 505. The "Project Processing" system 494004 can respond using the ProjectByPartyResponseMessage_sync message 494044 as shown, for example, in FIG. 506.

The "Consumer" system 494002 can make a project party by ID and party role code query using the ProjectPartyByIDAndPartyRoleCodeQueryMessage_sync 494046 as shown, for example, in FIG. 509. The "Project Processing" system 494004 can respond using the ProjectPartyByIDAndPartyRoleCodeResponseMessage_sync message 494048 as shown, for example, in FIG. 510.

Message Data Type

The message data type ProjectMessage_sync contains the business information that is relevant for sending a business document in a message, the Project included in the business document, and the Log. It contains the packages MessageHeader package, Project package, and Log package. The ProjectMessage_sync is used as an abstract maximal message data type, which unifies all packages and entities for the following concrete message data types (with cardinalities of Project and log entities): FIGS. 531-1 through 531-5 show a ProjectMessage 53100 package. The ProjectMessage 53100 package is a ProjectMessage 53104 datatype. The ProjectMessage 53100 package includes a ProjectMessage 53102 entity. The ProjectMessage 53100 package includes various packages, namely MessageHeader 53106, Project 53114 and Log 531134.

The MessageHeader 53106 package is a BasicBusinessDocumentMessageHeader 53112 datatype. The MessageHeader 53106 package includes a MessageHeader 53108 entity.

The MessageHeader 53108 entity has a cardinality of zero or one 53110 meaning that for each instance of the ProjectMessage 53102 entity there may be one MessageHeader 53108 entity.

The Project 53114 package includes a Project 53116 entity. The Project 53114 package includes a Task 53132 package.

The Project 53116 entity has a cardinality of zero or n 53118 meaning that for each instance of the ProjectMessage 53102 entity there may be one or more Project 53116 entities. The Project 53116 entity includes various attributes, namely ID 53120 and Description 53126.

The ID 53120 attribute is a ProjectID 53124 datatype. The ID 53120 attribute has a cardinality of one 53122 meaning that for each instance of the Project 53116 entity there is one ID 53120 attribute.

The Description 53126 attribute is a SHORT_Description 53130 datatype. The Description 53126 attribute has a cardinality of zero or one 53128 meaning that for each instance of the Project 53116 entity there may be one Description 53126 attribute.

The Task 53132 package includes a Task 53134 entity. The Task 53132 package includes various packages, namely WorkBreakdownStructureElement 53138, Network 53156 and Activity 53174.

The Task 53134 entity has a cardinality of one 53136 meaning that for each instance of the Project 53116 entity there is one Task 53134 entity.

The WorkBreakdownStructureElement 53138 package includes a WorkBreakdownStructureElement 53140 entity.

The WorkBreakdownStructureElement 53140 entity has a cardinality of zero or n 53142 meaning that for each instance of the Task 53134 entity there may be one or more WorkBreakdownStructureElement 53140 entities. The WorkBreakdownStructureElement 53140 entity includes various attributes, namely ID 53144 and Description 53150.

The ID 53144 attribute is a ProjectWorkBreakdownStructureElementID 53148 datatype. The ID 53144 attribute has a cardinality of one 53146 meaning that for each instance of the WorkBreakdownStructureElement 53140 entity there is one ID 53144 attribute.

The Description 53150 attribute is a SHORT_Description 53154 datatype. The Description 53150 attribute has a cardinality of zero or one 53152 meaning that for each instance of the WorkBreakdownStructureElement 53140 entity there may be one Description 53150 attribute.

The Network 53156 package includes a Network 53158 entity.

The Network 53158 entity has a cardinality of zero or n 53160 meaning that for each instance of the Task 53134 entity there may be one or more Network 53158 entities. The Network 53158 entity includes various attributes, namely ID 53162 and Description 53168.

The ID 53162 attribute is a ProjectNetworkID 53166 datatype. The ID 53162 attribute has a cardinality of one 53164 meaning that for each instance of the Network 53158 entity there is one ID 53162 attribute.

The Description 53168 attribute is a SHORT_Description 53172 datatype. The Description 53168 attribute has a cardinality of zero or one 53170 meaning that for each instance of the Network 53158 entity there may be one Description 53168 attribute.

The Activity 53174 package includes an Activity 53176 entity.

The Activity 53176 entity has a cardinality of zero or n 53178 meaning that for each instance of the Task 53134 entity there may be one or more Activity 53176 entities. The Activity 53176 entity includes various attributes, namely ID 53180, NetworkID 53186, TypeCode 53192, EarliestPlannedPeriod 53198, LatestPlannedPeriod 531104, ProductPrice 531110, PlannedCost 531116, Duration 531122 and Description 531128.

The ID 53180 attribute is a ProjectActivityID 53184 datatype. The ID 53180 attribute has a cardinality of one 53182 meaning that for each instance of the Activity 53176 entity there is one ID 53180 attribute.

The NetworkID 53186 attribute is a ProjectNetworkID 53190 datatype. The NetworkID 53186 attribute has a cardinality of one 53188 meaning that for each instance of the Activity 53176 entity there is one NetworkID 53186 attribute.

The TypeCode 53192 attribute is a ProjectActivityControlProfileCode 53196 datatype. The TypeCode 53192 attribute has a cardinality of one 53194 meaning that for each instance of the Activity 53176 entity there is one TypeCode 53192 attribute.

The EarliestPlannedPeriod 53198 attribute is an UPPEROPEN_GLOBAL_DateTimePeriod 531102 datatype. The EarliestPlannedPeriod 53198 attribute has a cardinality of zero or one 531100 meaning that for each instance of the Activity 53176 entity there may be one EarliestPlannedPeriod 53198 attribute.

The LatestPlannedPeriod 531104 attribute is an UPPEROPEN_GLOBAL_DateTimePeriod 531108 datatype. The LatestPlannedPeriod 531104 attribute has a cardinality of zero or one 531106 meaning that for each instance of the Activity 53176 entity there may be one LatestPlannedPeriod 531104 attribute.

The ProductPrice 531110 attribute is a Price 531114 datatype. The ProductPrice 531110 attribute has a cardinality of zero or one 531112 meaning that for each instance of the Activity 53176 entity there may be one ProductPrice 531110 attribute.

The PlannedCost 531116 attribute is an Amount 531120 datatype. The PlannedCost 531116 attribute has a cardinality of zero or one 531118 meaning that for each instance of the Activity 53176 entity there may be one PlannedCost 531116 attribute.

The Duration 531122 attribute is a Duration 531126 datatype. The Duration 531122 attribute has a cardinality of zero or one 531124 meaning that for each instance of the Activity 53176 entity there may be one Duration 531122 attribute.

The Description 531128 attribute is a SHORT_Description 531132 datatype. The Description 531128 attribute has a cardinality of zero or one 531130 meaning that for each instance of the Activity 53176 entity there may be one Description 531128 attribute.

The Log 531134 package is a Log 531140 datatype. The Log 531134 package includes a Log 531136 entity.

The Log 531136 entity has a cardinality of zero or one 531138 meaning that for each instance of the ProjectMessage 53102 entity there may be one Log 531136 entity.

MessageHeader Package

A MessageHeader package groups the business information that is relevant for sending a business document in a message.

MessageHeader

A MessageHeader groups business information from the perspective of the sending application, for example, information to identify the business document in a message.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

The Task package groups the Task with its entities. It contains the entities WorkBreakdownStructureElement, Network, and Activity.

WorkBreakdownStructureElement

The task WorkBreakdownStructureElement is an individual structural element in a work breakdown structure (WBS) representing the hierarchical organization of a project. It describes either a concrete task (work package) or a summary task that can be further subdivided. It contains the Attachment entity.

Attachment

An Attachment is an electronic document of any type whose content relates to the task WorkBreakdownStructureElement.

Network

The network contains organizational and controlling parameters and information that are binding for all activities within a network. The task specifies a framework for project Activity tasks representing the process rather than the organizational structure of a project.

Activity

The task activity is an individual project task representing the process rather than the organizational structure of a project. Activities can be connected via relations forming a sequential or net-like flow of tasks within a project that can be scheduled. It contains the Attachment entity.

Attachment

An Attachment is an electronic document of any type whose content relates to the task Activity.

Party Package

CustomerParty

A CustomerParty is a party to whom materials or services are offered or made available.

VendorParty

A VendorParty is a party that delivers goods or provides services.

ResponsibleEmployeeParty

A ResponsibleEmployeeParty is a party that is an employee which is responsible for the project.

ResponsibleOrganizationalUnitParty

A ResponsibleOrganizationalUnitParty is a business unit of an organizational structure of an enterprise which can take on one or several different business roles. A Name is a description of a party.

ContactParty

A ContactParty is a natural person or organizational unit that can be contacted for the CustomerParty.

Log Package

A Log package groups the error messages used for user interaction.

Log

A Log is a sequence of messages that result when an application executes a task.

Message Data Type

The message data type ProjectActivityChangeRequestMessage_sync contains the business information that is relevant for sending a business document in a message and the project included in the business document. FIGS. 526-1 through 526-2 show a ProjectActivityChangeRequest 52600 package. The ProjectActivityChangeRequest 52600 package is a ProjectActivityChangeRequestMessage 52604 datatype. The ProjectActivityChangeRequest 52600 package includes a ProjectActivityChangeRequestMessage 52602 entity. The ProjectActivityChangeRequest 52600 package includes various packages, namely MessageHeader 52606 and Project 52614.

The MessageHeader 52606 package is a BasicBusinessDocumentMessageHeader 52612 datatype. The MessageHeader 52606 package includes a MessageHeader 52608 entity.

The MessageHeader 52608 entity has a cardinality of zero or one 52610 meaning that for each instance of the ProjectActivityChangeRequestMessage 52602 entity there may be one MessageHeader 52608 entity.

The Project 52614 package includes a Project 52616 entity. The Project 52614 package includes a Task 52620 package.

The Project 52616 entity has a cardinality of one 52618 meaning that for each instance of the ProjectActivityChangeRequestMessage 52602 entity there is one Project 52616 entity.

The Task 52620 package includes a Task 52622 entity. The Task 52620 package includes an Activity 52626 package.

The Task 52622 entity has a cardinality of one 52624 meaning that for each instance of the Project 52616 entity there is one Task 52622 entity.

The Activity 52626 package includes an Activity 52628 entity.

The Activity 52628 entity has a cardinality of one 52630 meaning that for each instance of the Task 52622 entity there is one Activity 52628 entity. The Activity 52628 entity includes various attributes, namely ID 52632, NetworkID 52638, TypeCode 52644, EarliestPlannedPeriod 52650, LatestPlannedPeriod 52656, ProductPrice 52662, PlannedCost 52668, Duration 52674 and Description 52680.

The ID 52632 attribute is a ProjectActivityID 52636 datatype. The ID 52632 attribute has a cardinality of one 52634 meaning that for each instance of the Activity 52628 entity there is one ID 52632 attribute.

The NetworkID 52638 attribute is a ProjectNetworkID 52642 datatype. The NetworkID 52638 attribute has a cardinality of one 52640 meaning that for each instance of the Activity 52628 entity there is one NetworkID 52638 attribute.

The TypeCode 52644 attribute is a ProjectActivityControlProfileCode 52648 datatype. The TypeCode 52644 attribute has a cardinality of one 52646 meaning that for each instance of the Activity 52628 entity there is one TypeCode 52644 attribute.

The EarliestPlannedPeriod 52650 attribute is an UPPEROPEN_GLOBAL_DateTimePeriod 52654 datatype. The EarliestPlannedPeriod 52650 attribute has a cardinality of zero or one 52652 meaning that for each instance of the Activity 52628 entity there may be one EarliestPlannedPeriod 52650 attribute.

The LatestPlannedPeriod 52656 attribute is an UPPEROPEN_GLOBAL_DateTimePeriod 52660 datatype. The LatestPlannedPeriod 52656 attribute has a cardinality of zero or one 52658 meaning that for each instance of the Activity 52628 entity there may be one LatestPlannedPeriod 52656 attribute.

The ProductPrice 52662 attribute is a Price 52666 datatype. The ProductPrice 52662 attribute has a cardinality of zero or one 52664 meaning that for each instance of the Activity 52628 entity there may be one ProductPrice 52662 attribute.

The PlannedCost 52668 attribute is an Amount 52672 datatype. The PlannedCost 52668 attribute has a cardinality of zero or one 52670 meaning that for each instance of the Activity 52628 entity there may be one PlannedCost 52668 attribute.

The Duration 52674 attribute is a Duration 52678 datatype. The Duration 52674 attribute has a cardinality of zero or one 52676 meaning that for each instance of the Activity 52628 entity there may be one Duration 52674 attribute.

The Description 52680 attribute is a SHORT_Description 52684 datatype. The Description 52680 attribute has a cardinality of zero or one 52682 meaning that for each instance of the Activity 52628 entity there may be one Description 52680 attribute.

Project Package

Project package groups all the information pertaining to a project.

Project

Project is a business undertaking with a defined goal that is to be attained in a specified time frame. It is to be achieved using predefined funds and planned resources, while reaching an agreed quality level.

The project is characterized by the fact that it is unique and that it involves an element of risk.

Task Package

Task Package groups the task with its entities.

Activity

The task activity is an individual project task representing the process rather than the organizational structure of a project. Activities can be connected via relations forming a sequential or net-like flow of tasks within a project that can be scheduled.

Message Data Type

The message data type ProjectActivityChangeConfirmationMessage_sync contains the business information that is relevant for sending a business document in a message and the business information that is relevant for sending information, warning or error messages when processing operations. FIG. 525 shows a ProjectActivityChangeConfirmation 52500 package. The ProjectActivityChangeConfirmation 52500 package is a ProjectActivityChangeConfirmationMessage 52504 datatype. The ProjectActivityChangeConfirmation 52500 package includes a ProjectActivityChangeConfirmationMessage 52502 entity. The ProjectActivityChangeConfirmation 52500 package includes various packages, namely MessageHeader 52506 and Log 52514.

The MessageHeader 52506 package is a BasicBusinessDocumentMessageHeader 52512 datatype. The MessageHeader 52506 package includes a MessageHeader 52508 entity.

The MessageHeader 52508 entity has a cardinality of zero or one 52510 meaning that for each instance of the ProjectActivityChangeConfirmationMessage 52502 entity there may be one MessageHeader 52508 entity.

The Log 52514 package is a Log 52520 datatype. The Log 52514 package includes a Log 52516 entity.

The Log 52516 entity has a cardinality of one 52518 meaning that for each instance of the ProjectActivityChangeConfirmationMessage 52502 entity there is one Log 52516 entity.

Message Data Type

The message data type ProjectActivityChangeCheckQueryMessage_sync contains the business information that is relevant for sending a business document in a message and the project included in the business document. FIGS. 523-1 through 523-2 show a ProjectActivityChangeCheckQuery 52300 package. The ProjectActivityChangeCheckQuery 52300 package is a ProjectActivityChangeCheckQueryMessage 52304 datatype. The ProjectActivityChangeCheckQuery 52300 package includes a ProjectActivityChangeCheckQueryMessage 52302 entity. The ProjectActivityChangeCheckQuery 52300 package includes various packages, namely MessageHeader 52306 and Project 52314.

The MessageHeader 52306 package is a BasicBusinessDocumentMessageHeader 52312 datatype. The MessageHeader 52306 package includes a MessageHeader 52308 entity.

The MessageHeader 52308 entity has a cardinality of zero or one 52310 meaning that for each instance of the ProjectActivityChangeCheckQueryMessage 52302 entity there may be one MessageHeader 52308 entity.

The Project 52314 package includes a Project 52316 entity. The Project 52314 package includes a Task 52320 package.

The Project 52316 entity has a cardinality of one 52318 meaning that for each instance of the ProjectActivityChangeCheckQueryMessage 52302 entity there is one Project 52316 entity.

The Task 52320 package includes a Task 52322 entity. The Task 52320 package includes an Activity 52326 package.

The Task 52322 entity has a cardinality of one 52324 meaning that for each instance of the Project 52316 entity there is one Task 52322 entity.

The Activity 52326 package includes an Activity 52328 entity.

The Activity 52328 entity has a cardinality of one 52330 meaning that for each instance of the Task 52322 entity there is one Activity 52328 entity. The Activity 52328 entity includes various attributes, namely ID 52332, NetworkID 52338, TypeCode 52344, EarliestPlannedPeriod 52350, LatestPlannedPeriod 52356, ProductPrice 52362, PlannedCost 52368, Duration 52374 and Description 52380.

The ID 52332 attribute is a ProjectActivityID 52336 datatype. The ID 52332 attribute has a cardinality of one 52334 meaning that for each instance of the Activity 52328 entity there is one ID 52332 attribute.

The NetworkID 52338 attribute is a ProjectNetworkID 52342 datatype. The NetworkID 52338 attribute has a cardinality of one 52340 meaning that for each instance of the Activity 52328 entity there is one NetworkID 52338 attribute.

The TypeCode 52344 attribute is a ProjectActivityControlProfileCode 52348 datatype. The TypeCode 52344 attribute has a cardinality of one 52346 meaning that for each instance of the Activity 52328 entity there is one TypeCode 52344 attribute.

The EarliestPlannedPeriod 52350 attribute is an UPPEROPEN_GLOBAL_DateTimePeriod 52354 datatype. The EarliestPlannedPeriod 52350 attribute has a cardinality of zero or one 52352 meaning that for each instance of the Activity 52328 entity there may be one EarliestPlannedPeriod 52350 attribute.

The LatestPlannedPeriod 52356 attribute is an UPPEROPEN_GLOBAL_DateTimePeriod 52360 datatype. The LatestPlannedPeriod 52356 attribute has a cardinality of zero or one 52358 meaning that for each instance of the Activity 52328 entity there may be one LatestPlannedPeriod 52356 attribute.

The ProductPrice 52362 attribute is a Price 52366 datatype. The ProductPrice 52362 attribute has a cardinality of zero or one 52364 meaning that for each instance of the Activity 52328 entity there may be one ProductPrice 52362 attribute.

The PlannedCost 52368 attribute is an Amount 52372 datatype. The PlannedCost 52368 attribute has a cardinality of zero or one 52370 meaning that for each instance of the Activity 52328 entity there may be one PlannedCost 52368 attribute.

The Duration 52374 attribute is a Duration 52378 datatype. The Duration 52374 attribute has a cardinality of zero or one 52376 meaning that for each instance of the Activity 52328 entity there may be one Duration 52374 attribute.

The Description 52380 attribute is a SHORT_Description 52384 datatype. The Description 52380 attribute has a cardinality of zero or one 52382 meaning that for each instance of the Activity 52328 entity there may be one Description 52380 attribute.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

Task Package groups the task with its entities

Activity

The task activity is an individual project task representing the process rather than the organizational structure of a project. Activities can be connected via relations forming a sequential or net-like flow of tasks within a project that can be scheduled.

Message Data Type

The message data type ProjectActivityChangeCheckResponseMessage_sync contains the business information that is relevant for sending a business document in a message the business information that is relevant for sending information, warning or error messages when processing operations. FIG. 524 shows a ProjectActivityChangeCheckResponse 52400 package. The ProjectActivityChangeCheckResponse 52400 package is a ProjectActivityChangeCheckResponseMessage 52404 datatype. The ProjectActivityChangeCheckResponse 52400 package includes a ProjectActivityChangeCheckResponseMessage 52402 entity. The ProjectActivityChangeCheckResponse 52400 package includes various packages, namely MessageHeader 52406 and Log 52414.

The MessageHeader 52406 package is a BasicBusinessDocumentMessageHeader 52412 datatype. The MessageHeader 52406 package includes a MessageHeader 52408 entity.

The MessageHeader 52408 entity has a cardinality of zero or one 52410 meaning that for each instance of the ProjectActivityChangeCheckResponseMessage 52402 entity there may be one MessageHeader 52408 entity.

The Log 52414 package is a Log 52420 datatype. The Log 52414 package includes a Log 52416 entity.

The Log 52416 entity has a cardinality of one 52418 meaning that for each instance of the ProjectActivityChangeCheckResponseMessage 52402 entity there is one Log 52416 entity.

Message Data Type

The message data type ProjectWorkBreakdownStructureElementByWorkBreakdownStructureElementIDQueryMessage_sync contains the business information that is relevant for sending a business document in a message and the selection criteria for the query. FIG. 538 shows a ProjectWorkBreakdownStructureElementByWorkBreakdownStructureElementIDQueryMessage 53800 package. The ProjectWorkBreakdownStructureElementByWorkBreakdown StructureElementIDQueryMessage 53800 package is a ProjectWorkBreakdownStructureElementByWorkBreakdownStructureElementIDQueryMessage 53804 datatype. The ProjectWorkBreakdownStructureElementByWorkBreakdownStructureElementIDQueryMessage 53800 package includes a ProjectWorkBreakdownStructureElementByWorkBreakdownStructureElementIDQueryMessage 53802 entity. The ProjectWorkBreakdownStructureElementByWorkBreakdown StructureElementIDQueryMessage 53800 package includes various packages, namely MessageHeader 53806 and Selection 53814.

The MessageHeader 53806 package is a BasicBusinessDocumentMessageHeader 53812 datatype. The MessageHeader 53806 package includes a MessageHeader 53808 entity.

The MessageHeader 53808 entity has a cardinality of zero or one 53810 meaning that for each instance of the ProjectWorkBreakdownStructureElementByWorkBreakdownStructureElementIDQueryMessage 53802 entity there may be one MessageHeader 53808 entity.

The Selection 53814 package includes a ProjectWorkBreakdownStructureElementSelectionByWorkBreakdownStructureElementID 53816 entity. The ProjectWorkBreakdownStructureElementSelectionByWorkBreakdownStructureElementID 53816 entity has a cardinality of one 53818 meaning that for each instance of the ProjectWorkBreakdownStructureElementByWorkBreakdownStructureElementIDQueryMessage 53802 entity there is one ProjectWorkBreakdownStructureElementSelectionByWorkBreakdownStructureElementID 53816 entity. The ProjectWorkBreakdownStructureElementSelectionByWorkBreakdownStructureElementID 53816 entity includes a ProjectWorkBreakdownStructureElementID 53820 attribute.

The ProjectWorkBreakdownStructureElementID 53820 attribute is a ProjectWorkBreakdownStructureElementID 53824 datatype. The ProjectWorkBreakdownStructureElementID 53820 attribute has a cardinality of one 53822 meaning that for each instance of the ProjectWorkBreakdownStructureElementSelectionByWorkBreakdownStructureElementID 53816 entity there is one ProjectWorkBreakdownStructureElementID 53820 attribute.

Selection Package

The selection package collects all the selection criteria for ProjectWorkBreakdownStructureElementByWorkBreakdownStructureElementIDQueryMessage_sync.

ProjectWorkBreakdownStructureElementSelectionByWorkBreakdownStructureElementID

The ProjectWorkBreakdownStructureElementSelectionByWorkBreakdownStructureElementID contains the WorkBreakdownStructure selection element.

Message Data Type

The message data type ProjectWorkBreakdownStructureElementByWorkBreakdownStructureElementIDResponseMessage_sync contains the business information that is relevant for sending a business document in a message, the project included in the business document, and the Log.

FIGS. 539-1 through 539-2 show a ProjectWorkBreakdownStructureElementByWorkBreakdownStructureElementIDResponse 53900 package. The ProjectWorkBreakdownStructureElementByWorkBreakdown StructureElementIDResponse 53900 package is a ProjectWorkBreakdownStructureElementByWorkBreakdownStructureElementIDResponse Message 53904 datatype. The ProjectWorkBreakdownStructureElementByWorkBreakdownStructureElementIDResponse 53900 package includes a ProjectWorkBreakdownStructureElementByWorkBreakdown StructureElementIDResponse Message 53902 entity. The ProjectWorkBreakdownStructureElementByWorkBreakdownStructureElementIDResponse 53900 package includes various packages, namely MessageHeader 53906, Project 53914 and Log 53944.

The MessageHeader 53906 package is a BasicBusinessDocumentMessageHeader 53912 datatype. The MessageHeader 53906 package includes a MessageHeader 53908 entity.

The MessageHeader 53908 entity has a cardinality of zero or one 53910 meaning that for each instance of the ProjectWorkBreakdownStructureElementByWorkBreakdownStructureElementIDResponse Message 53902 entity there may be one MessageHeader 53908 entity.

The Project 53914 package includes a Project 53916 entity. The Project 53914 package includes a Task 53920 package.

The Project 53916 entity has a cardinality of zero or one 53918 meaning that for each instance of the ProjectWorkBreakdownStructureElementByWorkBreakdownStructureElementIDResponse Message 53902 entity there may be one Project 53916 entity.

The Task 53920 package includes a Task 53922 entity. The Task 53920 package includes a WorkBreakdownStructureElement 53926 package.

The Task 53922 entity has a cardinality of one 53924 meaning that for each instance of the Project 53916 entity there is one Task 53922 entity.

The WorkBreakdownStructureElement 53926 package includes a WorkBreakdownStructureElement 53928 entity.

The WorkBreakdownStructureElement 53928 entity has a cardinality of zero or one 53930 meaning that for each instance of the Task 53922 entity there may be one WorkBreakdownStructureElement 53928 entity. The WorkBreakdownStructureElement 53928 entity includes various attributes, namely ID 53932 and Description 53938.

The ID 53932 attribute is a ProjectWorkBreakdownStructureElementID 53936 datatype. The ID 53932 attribute has a cardinality of one 53934 meaning that for each instance of the WorkBreakdownStructureElement 53928 entity there is one ID 53932 attribute.

The Description 53938 attribute is a SHORT_Description 53942 datatype. The Description 53938 attribute has a cardinality of zero or one 53940 meaning that for each instance of the WorkBreakdownStructureElement 53928 entity there may be one Description 53938 attribute.

The Log 53944 package is a Log 53950 datatype. The Log 53944 package includes a Log 53946 entity.

The Log 53946 entity has a cardinality of one 53948 meaning that for each instance of the ProjectWorkBreakdownStructureElementByWorkBreakdownStructureElementIDResponse Message 53902 entity there is one Log 53946 entity.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

Task Package groups the task with its entities.

WorkBreakdownStructureElement

The task WorkBreakdownStructureElement is an individual structural element in a work breakdown structure (WBS) representing the hierarchical organization of a project. It describes either a concrete task (work package) or a summary task that can be further subdivided.

Message Data Type

The message data type ProjectActivityByActivityIDQueryMessage_sync contains the business information that is relevant for sending a business document in a message and the selection criteria for the query. FIG. 519 shows a ProjectActivityByActivityIDQueryMessage 51900 package. The ProjectActivityByActivityIDQueryMessage 51900 package is a ProjectActivityByActivityIDQueryMessage 51904 datatype. The ProjectActivityByActivityIDQueryMessage 51900 package includes a ProjectActivityByActivityIDQueryMessage 51902 entity. The ProjectActivityByActivityIDQueryMessage 51900 package includes various packages, namely MessageHeader 51906 and Selection 51914.

The MessageHeader 51906 package is a BasicBusinessDocumentMessageHeader 51912 datatype. The MessageHeader 51906 package includes a MessageHeader 51908 entity.

The MessageHeader 51908 entity has a cardinality of zero or one 51910 meaning that for each instance of the ProjectActivityByActivityIDQueryMessage 51902 entity there may be one MessageHeader 51908 entity.

The Selection 51914 package includes a ProjectActivitySelectionByActivityID 51916 entity.

The ProjectActivitySelectionByActivityID 51916 entity has a cardinality of one 51918 meaning that for each instance of the ProjectActivityByActivityIDQueryMessage 51902 entity there is one ProjectActivitySelectionByActivityID 51916 entity. The ProjectActivitySelectionByActivityID 51916 entity includes various attributes, namely ProjectActivityID 51920 and ProjectNetworkID 51926.

The ProjectActivityID 51920 attribute is a ProjectActivityID 51924 datatype. The ProjectActivityID 51920 attribute has a cardinality of one 51922 meaning that for each instance of the ProjectActivitySelectionByActivityID 51916 entity there is one ProjectActivityID 51920 attribute.

The ProjectNetworkID 51926 attribute is a ProjectNetworkID 51930 datatype. The ProjectNetworkID 51926 attribute has a cardinality of one 51928 meaning that for each instance of the ProjectActivitySelectionByActivityID 51916 entity there is one ProjectNetworkID 51926 attribute.

Selection Package

The Selection Package collects all the selection criteria for Activity.

ProjectActivitySelectionByActivityID

The ProjectActivitySelectionByActivityIDQuery_sync contains the activity selection elements.

Message Data Type

The message data type ProjectActivityByActivityIDResponseMessage_sync contains the business information that is relevant for sending a business document in a message, the project included in the business document, and the Log. FIGS. 520-1 through 520-3 show a ProjectActivityByActivityIDResponse 52000 package. The ProjectActivityByActivityIDResponse 52000 package is a ProjectActivityByActivityIDResponseMessage 52004 datatype. The ProjectActivityByActivityIDResponse 52000 package includes a ProjectActivityByActivityIDResponseMessage 52002 entity. The ProjectActivityByActivityIDResponse 52000 package includes various packages, namely MessageHeader 52006, Project 52014 and Log 52086.

The MessageHeader 52006 package is a BasicBusinessDocumentMessageHeader 52012 datatype. The MessageHeader 52006 package includes a MessageHeader 52008 entity.

The MessageHeader 52008 entity has a cardinality of zero or one 52010 meaning that for each instance of the ProjectActivityByActivityIDResponseMessage 52002 entity there may be one MessageHeader 52008 entity.

The Project 52014 package includes a Project 52016 entity. The Project 52014 package includes a Task 52020 package.

The Project 52016 entity has a cardinality of zero or one 52018 meaning that for each instance of the ProjectActivityByActivityIDResponseMessage 52002 entity there may be one Project 52016 entity.

The Task 52020 package includes a Task 52022 entity. The Task 52020 package includes an Activity 52026 package.

The Task 52022 entity has a cardinality of one 52024 meaning that for each instance of the Project 52016 entity there is one Task 52022 entity.

The Activity 52026 package includes an Activity 52028 entity.

The Activity 52028 entity has a cardinality of zero or one 52030 meaning that for each instance of the Task 52022 entity there may be one Activity 52028 entity. The Activity 52028 entity includes various attributes, namely ID 52032, NetworkID 52038, TypeCode 52044, EarliestPlannedPeriod 52050, LatestPlannedPeriod 52056, ProductPrice 52062, PlannedCost 52068, Duration 52074 and Description 52080.

The ID 52032 attribute is a ProjectActivityID 52036 datatype. The ID 52032 attribute has a cardinality of one 52034 meaning that for each instance of the Activity 52028 entity there is one ID 52032 attribute.

The NetworkID 52038 attribute is a ProjectNetworkID 52042 datatype. The NetworkID 52038 attribute has a cardinality of one 52040 meaning that for each instance of the Activity 52028 entity there is one NetworkID 52038 attribute.

The TypeCode 52044 attribute is a ProjectActivityControlProfileCode 52048 datatype. The TypeCode 52044 attribute has a cardinality of one 52046 meaning that for each instance of the Activity 52028 entity there is one TypeCode 52044 attribute.

The EarliestPlannedPeriod 52050 attribute is an UPPEROPEN_GLOBAL_DateTimePeriod 52054 datatype. The EarliestPlannedPeriod 52050 attribute has a cardinality of zero or one 52052 meaning that for each instance of the Activity 52028 entity there may be one EarliestPlannedPeriod 52050 attribute.

The LatestPlannedPeriod 52056 attribute is an UPPEROPEN_GLOBAL_DateTimePeriod 52060 datatype. The LatestPlannedPeriod 52056 attribute has a cardinality of zero or one 52058 meaning that for each instance of the Activity 52028 entity there may be one LatestPlannedPeriod 52056 attribute.

The ProductPrice 52062 attribute is a Price 52066 datatype. The ProductPrice 52062 attribute has a cardinality of zero or one 52064 meaning that for each instance of the Activity 52028 entity there may be one ProductPrice 52062 attribute.

The PlannedCost 52068 attribute is an Amount 52072 datatype. The PlannedCost 52068 attribute has a cardinality of zero or one 52070 meaning that for each instance of the Activity 52028 entity there may be one PlannedCost 52068 attribute.

The Duration 52074 attribute is a Duration 52078 datatype. The Duration 52074 attribute has a cardinality of zero or one 52076 meaning that for each instance of the Activity 52028 entity there may be one Duration 52074 attribute.

The Description 52080 attribute is a SHORT_Description 52084 datatype. The Description 52080 attribute has a cardinality of zero or one 52082 meaning that for each instance of the Activity 52028 entity there may be one Description 52080 attribute.

The Log 52086 package is a Log 52092 datatype. The Log 52086 package includes a Log 52088 entity.

The Log 52088 entity has a cardinality of one 52090 meaning that for each instance of the ProjectActivityByActivityIDResponseMessage 52002 entity there is one Log 52088 entity.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

Task Package groups the task with its entities.

Activity

The task activity is an individual project task representing the process rather than the organizational structure of a project. Activities can be connected via relations forming a sequential or net-like flow of tasks within a project that can be scheduled.

Message Data Type

The message data type ProjectActivityByWorkBreakdownStructureElementIDQueryMessage_sync contains the business information that is relevant for sending a business document in a message and he selection criteria for the query. FIG. 521 shows a ProjectActivityByWorkBreakdownStructureElementIDQueryMessage 52100 package. The ProjectActivityByWorkBreakdownStructureElementIDQueryMessage 52100 package is a ProjectActivityByWorkBreakdownStructureElementQueryMessage 52104 datatype. The ProjectActivityByWorkBreakdownStructureElementIDQueryMessage 52100 package includes a ProjectActivityByWorkBreakdownStructureElementIDQueryMessage 52102 entity. The ProjectActivityByWorkBreakdownStructureElementIDQueryMessage 52100 package includes various packages, namely MessageHeader 52106 and Selection 52114.

The MessageHeader 52106 package is a BasicBusinessDocumentMessageHeader 52112 datatype. The MessageHeader 52106 package includes a MessageHeader 52108 entity.

The MessageHeader 52108 entity has a cardinality of zero or one 52110 meaning that for each instance of the ProjectActivityByWorkBreakdownStructureElementIDQueryMessage 52102 entity there may be one MessageHeader 52108 entity.

The Selection 52114 package includes a ProjectActivitySelectionByWorkBreakdownStructureElementID 52116 entity.

The ProjectActivitySelectionByWorkBreakdownStructureElementID 52116 entity has a cardinality of one 52118 meaning that for each instance of the ProjectActivityByWorkBreakdownStructureElementIDQueryMessage 52102 entity there is one ProjectActivitySelectionByWorkBreakdownStructureElementID 52116 entity. The ProjectActivitySelectionByWorkBreakdownStructureElementID 52116 entity includes a ProjectWorkBreakdownStructureElementID 52120 attribute.

The ProjectWorkBreakdownStructureElementID 52120 attribute is a ProjectWorkBreakdownStructureElementID 52124 datatype. The ProjectWorkBreakdownStructureElementID 52120 attribute has a cardinality of one 52122 meaning that for each instance of the ProjectActivitySelectionByWorkBreakdownStructureElementID 52116 entity there is one ProjectWorkBreakdownStructureElementID 52120 attribute.

Selection Package

The selection package collects all the selection criteria for the ProjectActivity element.

ProjectActivitySelectionByWorkBreakdownStructureElementID

The ProjectActivitySelectionByWorkBreakdownStructureElementID contains selection criteria for activity element.

Message Data Type

The message data type ProjectActivityByWorkBreakdownStructureElementIDResponseMessage_sync contains the business information that is relevant for sending a business document in a message, the project included in the business document, and the Log. FIGS. 522-1 through 522-3 show a ProjectActivityByWorkBreakdownStructureElementIDResponse 52200 package. The ProjectActivityByWorkBreakdownStructureElementIDResponse 52200 package is a ProjectActivityByWorkBreakdownStructureElementIDResponseMessage 52204 datatype. The ProjectActivityByWorkBreakdownStructureElementIDResponse 52200 package includes a ProjectActivityByWorkBreakdownStructureElementIDResponseMessage 52202 entity. The ProjectActivityByWorkBreakdownStructureElementIDResponse 52200 package includes various packages, namely MessageHeader 52206, Project 52214 and Log 52286.

The MessageHeader 52206 package is a BasicBusinessDocumentMessageHeader 52212 datatype. The MessageHeader 52206 package includes a MessageHeader 52208 entity.

The MessageHeader 52208 entity has a cardinality of zero or one 52210 meaning that for each instance of the ProjectActivityByWorkBreakdownStructureElementIDResponseMessage 52202 entity there may be one MessageHeader 52208 entity.

The Project 52214 package includes a Project 52216 entity. The Project 52214 package includes a Task 52220 package.

The Project 52216 entity has a cardinality of zero or one 52218 meaning that for each instance of the ProjectActivityByWorkBreakdownStructureElementIDResponseMessage 52202 entity there may be one Project 52216 entity.

The Task 52220 package includes a Task 52222 entity. The Task 52220 package includes an Activity 52226 package.

The Task 52222 entity has a cardinality of one 52224 meaning that for each instance of the Project 52216 entity there is one Task 52222 entity.

The Activity 52226 package includes an Activity 52228 entity.

The Activity 52228 entity has a cardinality of zero or n 52230 meaning that for each instance of the Task 52222 entity there may be one or more Activity 52228 entities. The Activity 52228 entity includes various attributes, namely ID 52232, NetworkID 52238, TypeCode 52244, EarliestPlannedPeriod 52250, LatestPlannedPeriod 52256, ProductPrice 52262, PlannedCost 52268, Duration 52274 and Description 52280.

The ID 52232 attribute is a ProjectActivityID 52236 datatype. The ID 52232 attribute has a cardinality of one 52234 meaning that for each instance of the Activity 52228 entity there is one ID 52232 attribute.

The NetworkID 52238 attribute is a ProjectNetworkID 52242 datatype. The NetworkID 52238 attribute has a cardinality of one 52240 meaning that for each instance of the Activity 52228 entity there is one NetworkID 52238 attribute.

The TypeCode 52244 attribute is a ProjectActivityControlProfileCode 52248 datatype. The TypeCode 52244 attribute has a cardinality of one 52246 meaning that for each instance of the Activity 52228 entity there is one TypeCode 52244 attribute.

The EarliestPlannedPeriod 52250 attribute is an UPPEROPEN_GLOBAL_DateTimePeriod 52254 datatype. The EarliestPlannedPeriod 52250 attribute has a cardinality of zero or one 52252 meaning that for each instance of the Activity 52228 entity there may be one EarliestPlannedPeriod 52250 attribute.

The LatestPlannedPeriod 52256 attribute is an UPPEROPEN_GLOBAL_DateTimePeriod 52260 datatype. The LatestPlannedPeriod 52256 attribute has a cardinality of zero or one 52258 meaning that for each instance of the Activity 52228 entity there may be one LatestPlannedPeriod 52256 attribute.

The ProductPrice 52262 attribute is a Price 52266 datatype. The ProductPrice 52262 attribute has a cardinality of zero or one 52264 meaning that for each instance of the Activity 52228 entity there may be one ProductPrice 52262 attribute.

The PlannedCost 52268 attribute is an Amount 52272 datatype. The PlannedCost 52268 attribute has a cardinality of zero or one 52270 meaning that for each instance of the Activity 52228 entity there may be one PlannedCost 52268 attribute.

The Duration 52274 attribute is a Duration 52278 datatype. The Duration 52274 attribute has a cardinality of zero or one 52276 meaning that for each instance of the Activity 52228 entity there may be one Duration 52274 attribute.

The Description 52280 attribute is a SHORT_Description 52284 datatype. The Description 52280 attribute has a cardinality of zero or one 52282 meaning that for each instance of the Activity 52228 entity there may be one Description 52280 attribute.

The Log 52286 package is a Log 52292 datatype. The Log 52286 package includes a Log 52288 entity.

The Log 52288 entity has a cardinality of one 52290 meaning that for each instance of the ProjectActivityByWorkBreakdownStructureElementIDResponseMessage 52202 entity there is one Log 52288 entity.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

Task Package groups the task with its entities.

Activity

The task activity is an individual project task representing the process rather than the organizational structure of a project. Activities can be connected via relations forming a sequential or net-like flow of tasks within a project that can be scheduled.

Message Data Type

The message data type ProjectDescriptionByIDQueryMessage_sync contains the selection criteria for the query. FIG. 529 shows a ProjectDescriptionByIDQueryMessage 52900 package. The ProjectDescriptionByIDQueryMessage 52900 package is a ProjectDescriptionByIDQueryMessage 52904 datatype. The ProjectDescriptionByIDQueryMessage 52900 package includes a ProjectDescriptionByIDQueryMessage 52902 entity. The ProjectDescriptionByIDQueryMessage 52900 package includes a Selection 52906 package.

The Selection 52906 package includes a ProjectDescriptionSelectionByID 52908 entity.

The ProjectDescriptionSelectionByID 52908 entity has a cardinality of one 52910 meaning that for each instance of the ProjectDescriptionByIDQueryMessage 52902 entity there is one ProjectDescriptionSelectionByID 52908 entity. The ProjectDescriptionSelectionByID 52908 entity includes a ProjectID 52912 attribute.

The ProjectID 52912 attribute is a ProjectID 52916 datatype. The ProjectID 52912 attribute has a cardinality of one 52914 meaning that for each instance of the ProjectDescriptionSelectionByID 52908 entity there is one ProjectID 52912 attribute.

Selection Package

The selection package collects all the selection criteria for the Project.

ProjectDescriptionSelectionByID

Message Data Type

The message data type ProjectDescriptionByIDResponseMessage_sync contains the project included in the business document and the Log. FIG. 530 shows a ProjectDescriptionByIDResponse 53000 package. The ProjectDescriptionByIDResponse 53000 package is a ProjectDescriptionByIDResponseMessage 53004 datatype. The ProjectDescriptionByIDResponse 53000 package includes a ProjectDescriptionByIDResponseMessage 53002 entity. The ProjectDescriptionByIDResponse 53000 package includes various packages, namely Project 53006 and Log 53024.

The Project 53006 package includes a Project 53008 entity.

The Project 53008 entity has a cardinality of zero or n 53010 meaning that for each instance of the ProjectDescriptionByIDResponseMessage 53002 entity there may be one or more Project 53008 entities. The Project 53008 entity includes various attributes, namely ID 53012 and Description 53018.

The ID 53012 attribute is a ProjectID 53016 datatype. The ID 53012 attribute has a cardinality of one 53014 meaning that for each instance of the Project 53008 entity there is one ID 53012 attribute.

The Description 53018 attribute is a SHORT_Description 53022 datatype. The Description 53018 attribute has a cardinality of zero or one 53020 meaning that for each instance of the Project 53008 entity there may be one Description 53018 attribute.

The Log 53024 package is a Log 53030 datatype. The Log 53024 package includes a Log 53026 entity.

The Log 53026 entity has a cardinality of one 53028 meaning that for each instance of the ProjectDescriptionByIDResponseMessage 53002 entity there is one Log 53026 entity.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Message Data Type

The message data type ProjectWorkBreakdownStructureElementByIDQueryMessage_sync contains the selection criteria for the query. FIG. 536 shows a ProjectWorkBreakdownStructureElementByIDQueryMessage 53600 package. The ProjectWorkBreakdownStructureElementByIDQueryMessage 53600 package is a ProjectWorkBreakdownStructureElementByIDQueryMessage 53604 datatype. The ProjectWorkBreakdownStructureElementByIDQueryMessage 53600 package includes a ProjectWorkBreakdownStructureElementByIDQueryMessage 53602 entity. The ProjectWorkBreakdownStructureElementByIDQueryMessage 53600 package includes a Selection 53606 package.

The Selection 53606 package includes a ProjectWorkBreakdownStructureElementSelectionByID 53608 entity.

The ProjectWorkBreakdownStructureElementSelectionByID 53608 entity has a cardinality of one 53610 meaning that for each instance of the ProjectWorkBreakdownStructureElementByIDQueryMessage 53602 entity there is one ProjectWorkBreakdownStructureElementSelectionByID 53608 entity. The ProjectWorkBreakdownStructureElementSelectionByID 53608 entity includes a ProjectID 53612 attribute.

The ProjectID 53612 attribute is a ProjectID 53616 datatype. The ProjectID 53612 attribute has a cardinality of one 53614 meaning that for each instance of the ProjectWorkBreakdownStructureElementSelectionByID 53608 entity there is one ProjectID 53612 attribute.

Selection Package

The selection package collects all the selection criteria for the WorkBreakdownStructure elements.

ProjectWorkBreakdownStructureElementSelectionByID

Message Data Type

The message data type ProjectWorkBreakdownStructureElementByIDResponseMessage_sync contains the project included in the business document and the Log. FIG. 537 shows a ProjectWorkBreakdownStructureElementByIDResponse 53700 package. The ProjectWorkBreakdownStructureElementByIDResponse 53700 package is a ProjectWorkBreakdownStructureElementByIDResponseMessage 53704 datatype. The ProjectWorkBreakdownStructureElementByIDResponse 53700 package includes a ProjectWorkBreakdownStructureElementByIDResponseMessage 53702 entity. The ProjectWorkBreakdownStructureElementByIDResponse 53700 package includes various packages, namely Project 53706 and Log 53728.

The Project 53706 package includes a Project 53708 entity.

The Project 53708 entity has a cardinality of zero or one 53710 meaning that for each instance of the ProjectWorkBreakdownStructureElementByIDResponseMessage 53702 entity there may be one Project 53708 entity. The Project 53708 entity includes a WorkBreakdownStructureElement 53712 subordinate entity.

The WorkBreakdownStructureElement 53712 entity includes various attributes, namely ID 53716 and Description 53722.

The ID 53716 attribute is a ProjectWorkBreakdownStructureElementID 53720 datatype. The ID 53716 attribute has a cardinality of one 53718 meaning that for each instance of the WorkBreakdownStructureElement 53712 entity there is one ID 53716 attribute.

The Description 53722 attribute is a SHORT_Description 53726 datatype. The Description 53722 attribute has a cardinality of zero or one 53724 meaning that for each instance of the WorkBreakdownStructureElement 53712 entity there may be one Description 53722 attribute.

The Log 53728 package is a Log 53734 datatype. The Log 53728 package includes a Log 53730 entity.

The Log 53730 entity has a cardinality of one 53732 meaning that for each instance of the ProjectWorkBreakdownStructureElementByIDResponseMessage 53702 entity there is one Log 53730 entity.

Project Package

Project package groups all the information pertaining to a project.

Project

Project is a business undertaking with a defined goal that is to be attained in a specified time frame. It is to be achieved using predefined finds and planned resources, while reaching an agreed quality level. The project is characterized by the fact that it is unique and that it involves an element of risk.

WorkBreakdownStructureElement

The work breakdown structure element is an individual structural element in a work breakdown structure (WBS) representing the hierarchical organization of a project. It describes either a concrete task (work package) or a summary task that can be further subdivided.

Message Data Type

The message data type ProjectPartyByIDAndPartyRoleCodeQueryMessage_sync contains the selection criteria for the query. FIG. 532 shows a ProjectPartyByIDAndRoleCodeQueryMessage 53200 package. The ProjectPartyByIDAndRoleCodeQueryMessage 53200 package is a ProjectPartyByIDAndRoleCodeQueryMessage 53204 datatype. The ProjectPartyByIDAndRoleCodeQueryMessage 53200 package includes a ProjectPartyByIDAndRoleCodeQueryMessage 53202 entity. The ProjectPartyByIDAndRoleCodeQueryMessage 53200 package includes a Selection 53206 package.

The selection 53206 package includes a ProjectPartySelectionByIDAndPartyRoleCode 53208 entity.

The ProjectPartySelectionByIDAndPartyRoleCode 53208 entity has a cardinality of one 53210 meaning that for each instance of the ProjectPartyByIDAndRoleCodeQueryMessage 53202 entity there is one ProjectPartySelectionByIDAndPartyRoleCode 53208 entity. The ProjectPartySelectionByIDAndPartyRoleCode 53208 entity includes various attributes, namely ID 53212 and PartyRoleCode 53218.

The ID 53212 attribute is a ProjectID 53216 datatype. The ID 53212 attribute has a cardinality of one 53214 meaning that for each instance of the ProjectPartySelectionByIDAndPartyRoleCode 53208 entity there is one ID 53212 attribute.

The PartyRoleCode 53218 attribute is a PartyRoleCode 53222 datatype. The PartyRoleCode 53218 attribute has a cardinality of one 53220 meaning that for each instance of the ProjectPartySelectionByIDAndPartyRoleCode 53208 entity there is one PartyRoleCode 53218 attribute.

Selection Package

The selection package collects all the selection criteria for the Project Party.

Message Data Type

The message data type ProjectPartyByIDAndPartyRoleCodeResponseMessage_sync contains the project included in the business document and the Log. FIGS. 533-1 through 533-5 show a ProjectPartyByIDAndRoleCodeResponse 53300 package. The ProjectPartyByIDAndRoleCodeResponse 53300 package is a ProjectPartyByIDAndRoleCodeResponseMessage 53304 datatype. The ProjectPartyByIDAndRoleCodeResponse 53300 package includes a ProjectPartyByIDAndRoleCodeResponseMessage 53302 entity. The ProjectPartyByIDAndRoleCodeResponse 53300 package includes various packages, namely Project 53306 and Log 533192.

The Project 53306 package includes a Project 53308 entity.

The Project 53308 entity has a cardinality of zero or one 53310 meaning that for each instance of the ProjectPartyByIDAndRoleCodeResponseMessage 53302 entity there may be one Project 53308 entity. The Project 53308 entity includes an ID 53312 attribute. The Project 53308 entity includes a Party 53318 subordinate entity.

The ID 53312 attribute is a ProjectID 53316 datatype. The ID 53312 attribute has a cardinality of one 53314 meaning that for each instance of the Project 53308 entity there is one ID 53312 attribute.

The Party 53318 entity has a cardinality of zero or n 53320 meaning that for each instance of the Project 53308 entity there may be one or more Party 53318 entities. The Party 53318 entity has various subordinate entities, namely CustomerParty 53322, VendorParty 53344, ResponsibleEmployeeParty 53366, ResponsibleOrganizationalUnitParty 53388 and ContactParty 533110.

The CustomerParty 53322 entity has a cardinality of zero or n 53324 meaning that for each instance of the Party 53318 entity there may be one or more CustomerParty 53322 entities. The CustomerParty 53322 entity includes various attributes, namely ID 53326, RoleCode 53332 and Name 53338.

The ID 53326 attribute is a PartyID 53330 datatype. The ID 53326 attribute has a cardinality of one 53328 meaning that for each instance of the CustomerParty 53322 entity there is one ID 53326 attribute.

The RoleCode 53332 attribute is a PartyRoleCode 53336 datatype. The RoleCode 53332 attribute has a cardinality of one 53334 meaning that for each instance of the CustomerParty 53322 entity there is one RoleCode 53332 attribute.

The Name 53338 attribute is a MEDIUM_Name 53342 datatype. The Name 53338 attribute has a cardinality of zero or one 53340 meaning that for each instance of the CustomerParty 53322 entity there may be one Name 53338 attribute.

The VendorParty 53344 entity has a cardinality of zero or n 53346 meaning that for each instance of the Party 53318 entity there may be one or more VendorParty 53344 entities. The VendorParty 53344 entity includes various attributes, namely ID 53348, RoleCode 53354 and Name 53360.

The ID 53348 attribute is a PartyID 53352 datatype. The ID 53348 attribute has a cardinality of one 53350 meaning that for each instance of the VendorParty 53344 entity there is one ID 53348 attribute.

The RoleCode 53354 attribute is a PartyRoleCode 53358 datatype. The RoleCode 53354 attribute has a cardinality of one 53356 meaning that for each instance of the VendorParty 53344 entity there is one RoleCode 53354 attribute.

The Name 53360 attribute is a MEDIUM_Name 53364 datatype. The Name 53360 attribute has a cardinality of zero or one 53362 meaning that for each instance of the VendorParty 53344 entity there may be one Name 53360 attribute.

The ResponsibleEmployeeParty 53366 entity has a cardinality of zero or n 53368 meaning that for each instance of the Party 53318 entity there may be one or more ResponsibleEmployeeParty 53366 entities. The ResponsibleEmployeeParty 53366 entity includes various attributes, namely ID 53370, RoleCode 53376 and Name 53382.

The ID 53370 attribute is a PartyID 53374 datatype. The ID 53370 attribute has a cardinality of one 53372 meaning that for each instance of the ResponsibleEmployeeParty 53366 entity there is one ID 53370 attribute.

The RoleCode 53376 attribute is a PartyRoleCode 53380 datatype. The RoleCode 53376 attribute has a cardinality of one 53378 meaning that for each instance of the ResponsibleEmployeeParty 53366 entity there is one RoleCode 53376 attribute.

The Name 53382 attribute is a MEDIUM_Name 53386 datatype. The Name 53382 attribute has a cardinality of zero or one 53384 meaning that for each instance of the ResponsibleEmployeeParty 53366 entity there may be one Name 53382 attribute.

The ResponsibleOrganizationalUnitParty 53388 entity has a cardinality of zero or n 53390 meaning that for each instance of the Party 53318 entity there may be one or more ResponsibleOrganizationalUnitParty 53388 entities. The ResponsibleOrganizationalUnitParty 53388 entity includes various attributes, namely ID 53392, RoleCode 53398 and Name 533104.

The ID 53392 attribute is a PartyID 53396 datatype. The ID 53392 attribute has a cardinality of one 53394 meaning that for each instance of the ResponsibleOrganizationalUnitParty 53388 entity there is one ID 53392 attribute.

The RoleCode 53398 attribute is a PartyRoleCode 533102 datatype. The RoleCode 53398 attribute has a cardinality of one 533100 meaning that for each instance of the ResponsibleOrganizationalUnitParty 53388 entity there is one RoleCode 53398 attribute.

The Name 533104 attribute is a MEDIUM_Name 533108 datatype. The Name 533104 attribute has a cardinality of zero or one 533106 meaning that for each instance of the ResponsibleOrganizationalUnitParty 53388 entity there may be one Name 533104 attribute.

The ContactParty 533110 entity has a cardinality of zero or n 533112 meaning that for each instance of the Party 53318 entity there may be one or more ContactParty 533110 entities. The ContactParty 533110 entity includes various attributes, namely ID 533114, RoleCode 533120 and Name 533126. The ContactParty 533110 entity has various subordinate entities, namely ProjectManagerParty 533132, ProjectControllerParty 533144, ProjectSchedulerParty 533156, ProjectIssueManagerParty 533168 and ProjectTeamMemberParty 533180.

The ID 533114 attribute is a PartyID 533118 datatype. The ID 533114 attribute has a cardinality of one 533116 meaning that for each instance of the ContactParty 533110 entity there is one ID 533114 attribute.

The RoleCode 533120 attribute is a PartyRoleCode 533124 datatype. The RoleCode 533120 attribute has a cardinality of one 533122 meaning that for each instance of the ContactParty 533110 entity there is one RoleCode 533120 attribute.

The Name 533126 attribute is a MEDIUM_Name 533130 datatype. The Name 533126 attribute has a cardinality of zero or one 533128 meaning that for each instance of the ContactParty 533110 entity there may be one Name 533126 attribute.

The ProjectManagerParty 533132 entity has a cardinality of zero or n 533134 meaning that for each instance of the ContactParty 533110 entity there may be one or more ProjectManagerParty 533132 entities.

The ProjectControllerParty 533144 entity has a cardinality of zero or n 533146 meaning that for each instance of the ContactParty 533110 entity there may be one or more ProjectControllerParty 533144 entities.

The ProjectSchedulerParty 533156 entity has a cardinality of zero or n 533158 meaning that for each instance of the ContactParty 533110 entity there may be one or more ProjectSchedulerParty 533156 entities.

The ProjectIssueManagerParty 533168 entity has a cardinality of zero or n 533170 meaning that for each instance of the ContactParty 533110 entity there may be one or more ProjectIssueManagerParty 533168 entities.

The ProjectTeamMemberParty 533180 entity has a cardinality of zero or n 533182 meaning that for each instance of the ContactParty 533110 entity there may be one or more ProjectTeamMemberParty 533180 entities.

The Log 533192 package is a Log 533198 datatype. The Log 533192 package includes a Log 533194 entity.

The Log 533194 entity has a cardinality of one 533196 meaning that for each instance of the ProjectPartyByIDAndRoleCodeResponseMessage 53302 entity there is one Log 533194 entity.

Project Package

Project package groups all the information pertaining to a project.

Project

Project is a business undertaking with a defined goal that is to be attained in a specified time frame. It can be achieved using predefined funds and planned resources, while reaching an agreed quality level. The project is characterized by the fact that it is unique and that it involves an element of risk.

Party Package

Message Data Type

The message data type ProjectByPartyQueryMessage_sync contains the selection criteria for the query. FIG. 527 shows a ProjectByPartyQueryMessage 52700 package. The ProjectByPartyQueryMessage 52700 package is a ProjectByPartyQueryMessage 52704 datatype. The ProjectByPartyQueryMessage 52700 package includes a ProjectByPartyQueryMessage 52702 entity. The ProjectByPartyQueryMessage 52700 package includes a Selection 52706 package.

The Selection 52706 package includes a ProjectSelectionByParty 52708 entity.

The ProjectSelectionByParty 52708 entity has a cardinality of one 52710 meaning that for each instance of the ProjectByPartyQueryMessage 52702 entity there is one ProjectSelectionByParty 52708 entity. The ProjectSelectionByParty 52708 entity includes various attributes, namely PartyID 52712 and PartyRoleCode 52718.

The PartyID 52712 attribute is a PartyID 52716 datatype. The PartyID 52712 attribute has a cardinality of one 52714 meaning that for each instance of the ProjectSelectionByParty 52708 entity there is one PartyID 52712 attribute.

The PartyRoleCode 52718 attribute is a PartyRoleCode 52722 datatype. The PartyRoleCode 52718 attribute has a cardinality of one 52720 meaning that for each instance of the ProjectSelectionByParty 52708 entity there is one PartyRoleCode 52718 attribute.

Selection Package

The selection package collects all the selection criteria for the Project.

ProjectSelectionByParty

Message Data Type

The message data type ProjectByPartyResponseMessage_sync contains the project included in the business document and the Log. FIG. 528 shows a ProjectByPartyResponseMessage 52800 package. The ProjectByPartyResponseMessage 52800 package is a ProjectByPartyResponseMessage 52804 datatype. The ProjectByPartyResponseMessage 52800 package includes a ProjectByPartyResponseMessage 52802 entity. The ProjectByPartyResponseMessage 52800 package includes various packages, namely Project 52806 and Log 52824.

The Project 52806 package includes a Project 52808 entity.

The Project 52808 entity has a cardinality of zero or n 52810 meaning that for each instance of the ProjectByPartyResponseMessage 52802 entity there may be one or more Project 52808 entities. The Project 52808 entity includes various attributes, namely ID 52812 and Description 52818.

The ID 52812 attribute is a ProjectID 52816 datatype. The ID 52812 attribute has a cardinality of one 52814 meaning that for each instance of the Project 52808 entity there is one ID 52812 attribute.

The Description 52818 attribute is a SHORT_Description 52822 datatype. The Description 52818 attribute has a cardinality of zero or one 52820 meaning that for each instance of the Project 52808 entity there may be one Description 52818 attribute.

The Log 52824 package is a Log 52830 datatype. The Log 52824 package includes a Log 52826 entity.

The Log 52826 entity has a cardinality of one 52828 meaning that for each instance of the ProjectByPartyResponseMessage 52802 entity there is one Log 52826 entity.

Project Package

Project package groups all the information pertaining to a project.

Project

Project is a business undertaking with a defined goal that is to be attained in a specified time frame. It can be achieved using predefined finds and planned resources, while reaching an agreed quality level.

Message Data Type

The message data type ProjectActivityAttachmentByActivityIDAndNetworkIDQueryMessage_sync contains the selection criteria for the query. FIG. 517 shows a ProjectActivityAttachmentByActivityIDAndNetworkIDQueryMessage 51700 package. The ProjectActivityAttachmentByActivityIDAndNetworkID QueryMessage 51700 package is a ProjectActivityAttachmentByActivityIDAndNetworkIDQueryMessage 51704 datatype. The ProjectActivityAttachmentByActivityIDAndNetworkIDQueryMessage 51700 package includes a ProjectActivityAttachmentByActivityIDAndNetworkIDQueryMessage 51702 entity. The ProjectActivityAttachmentByActivityIDAndNetworkIDQueryMessage 51700 package includes a Selection 51706 package.

The Selection 51706 package includes a ProjectActivityAttachmentSelectionByActivityIDAndNetworkID 51708 entity.

The ProjectActivityAttachmentSelectionByActivityIDAndNetworkID 51708 entity has a cardinality of one 51710 meaning that for each instance of the ProjectActivityAttachmentByActivityIDAndNetworkIDQueryMessage 51702 entity there is one ProjectActivityAttachmentSelectionByActivityIDAndNetworkID 51708 entity. The ProjectActivityAttachmentSelectionByActivityIDAndNetworkID 51708 entity includes various attributes, namely ProjectActivityID 51712 and ProjectNetworkID 51718.

The ProjectActivityID 51712 attribute is a ProjectActivityID 51716 datatype. The ProjectActivityID 51712 attribute has a cardinality of one 51714 meaning that for each instance of the ProjectActivityAttachmentSelectionByActivityIDAndNetworkID 51708 entity there is one ProjectActivityID 51712 attribute.

The ProjectNetworkID 51718 attribute is a ProjectNetworkID 51722 datatype. The ProjectNetworkID 51718 attribute has a cardinality of one 51720 meaning that for each instance of the ProjectActivityAttachmentSelectionByActivityIDAndNetworkID 51708 entity there is one ProjectNetworkID 51718 attribute.

Selection Package

The selection package collects all the selection criteria for activity attachment.

ProjectActivityAttachmentSelectionByActivityIDAndNetworkID

The ProjectActivityAttachmentSelectionByActivityIDAndNetworkID contains activity element.

Message Data Type

The message data type ProjectActivityAttachmentByActivityIDAndNetworkIDResponseMessage_sync contains the project included in the business document and the Log. FIGS. 518-1 through 518-2 show a ProjectActivityAttachmentByActivityIDAndNetworkIDResponse 51800 package. The ProjectActivityAttachmentByActivityIDAndNetworkIDResponse 51800 package is a ProjectActivityAttachmentByActivityIDAndNetworkIDResponseMessage 51804 datatype. The ProjectActivityAttachmentByActivityIDAndNetworkIDResponse 51800 package includes a ProjectActivityAttachmentByActivityIDAndNetworkIDResponseMessage 51802 entity. The ProjectActivityAttachmentByActivityIDAndNetworkIDResponse 51800 package includes various packages, namely Project 51806 and Log 51862.

The Project 51806 package includes a Project 51808 entity.

The Project 51808 entity has a cardinality of zero or one 51810 meaning that for each instance of the ProjectActivityAttachmentByActivityIDAndNetworkIDResponseMessage 51802 entity there may be one Project 51808 entity. The Project 51808 entity includes an ID 51812 attribute. The Project 51808 entity includes an Activity 51818 subordinate entity.

The ID 51812 attribute is a ProjectID 51816 datatype. The ID 51812 attribute has a cardinality of one 51814 meaning that for each instance of the Project 51808 entity there is one ID 51812 attribute.

The Activity 51818 entity has a cardinality of zero or one 51820 meaning that for each instance of the Project 51808 entity there may be one Activity 51818 entity. The Activity 51818 entity includes various attributes, namely ID 51822 and NetworkID 51828. The Activity 51818 entity includes an Attachment 51834 subordinate entity.

The ID 51822 attribute is a ProjectActivityID 51826 datatype. The ID 51822 attribute has a cardinality of one 51824 meaning that for each instance of the Activity 51818 entity there is one ID 51822 attribute.

The NetworkID 51828 attribute is a ProjectNetworkID 51832 datatype. The NetworkID 51828 attribute has a cardinality of one 51830 meaning that for each instance of the Activity 51818 entity there is one NetworkID 51828 attribute.

The Attachment 51834 entity has a cardinality of zero or n 51836 meaning that for each instance of the Activity 51818 entity there may be one or more Attachment 51834 entities. The Attachment 51834 entity includes various attributes, namely Name 51838, AlternativeDocumentID 51844, TypeCode 51850 and VersionID 51856.

The Name 51838 attribute is a LANGUAGEINDEPENDENT_EXTENDED_Name 51842 datatype. The Name 51838 attribute has a cardinality of one 51840 meaning that for each instance of the Attachment 51834 entity there is one Name 51838 attribute.

The AlternativeDocumentID 51844 attribute is an AlternativeDocumentID 51848 datatype. The AlternativeDocumentID 51844 attribute has a cardinality of one 51846 meaning that for each instance of the Attachment 51834 entity there is one AlternativeDocumentID 51844 attribute.

The TypeCode 51850 attribute is a DocumentTypeCode 51854 datatype. The TypeCode 51850 attribute has a cardinality of one 51852 meaning that for each instance of the Attachment 51834 entity there is one TypeCode 51850 attribute.

The VersionID 51856 attribute is a VersionID 51860 datatype. The VersionID 51856 attribute has a cardinality of one 51858 meaning that for each instance of the Attachment 51834 entity there is one VersionID 51856 attribute.

The Log 51862 package is a Log 51868 datatype. The Log 51862 package includes a Log 51864 entity.

The Log 51864 entity has a cardinality of one 51866 meaning that for each instance of the ProjectActivityAttachmentByActivityIDAndNetworkIDResponseMessage 51802 entity there is one Log 51864 entity.

Project Package

Project package groups all the information pertaining to a project.

Project

Project is a business undertaking with a defined goal that is to be attained in a specified time frame. It is to be achieved using predefined finds and planned resources, while reaching an agreed quality level. The project is characterized by the fact that it is unique and that it involves an element of risk.

Task Package

Task Package groups the task with its entities.

Activity

The task is an individual project task representing the process rather than the organizational structure of a project. Activities can be connected via relations forming a sequential or net-like flow of tasks within a project that can be scheduled. They can have a duration, a defined start and a defined end date, they can be used to plan internal and external resources (capacity, material, services) and they may incur costs. As task it can have parent relation to NetworkHeader, parent relation(s) to WorkBreakdownStructureElement(s) and parent and child relation(s) to Activity(s).

Message Data Type

The message data type ProjectWorkBreakdownStructureElementAttachmentByWorkBreakdownStructureElementIDQueryMessage_sync contains the selection criteria for the query. FIG. 534 shows a ProjectWorkBreakdownStructureElementAttachmentByWorkBreakdownStructureElementID QueryMessage 53400 package. The ProjectWorkBreakdown StructureElementAttachmentByWorkBreakdownStructureElementID QueryMessage 53400 package is a ProjectWorkBreakdownStructureElementAttachmentByWorkBreakdownStructureElementID QueryMessage 53404 datatype. The ProjectWorkBreakdownStructureElementAttachmentByWorkBreakdownStructure ElementID QueryMessage 53400 package includes a ProjectWorkBreakdownStructureElementAttachmentByWork BreakdownStructureElementIDQueryMessage 53402 entity. The ProjectWorkBreakdownStructureElementAttachmentByWork- BreakdownStructureElementIDQueryMessage 53400 package includes a Selection 53406 package.

The Selection 53406 package includes a ProjectWorkBreakdownStructureElementAttachmentSelectionByWorkBreakdownStructure ElementID 53408 entity.

The ProjectWorkBreakdownStructureElementAttachmentSelectionByWorkBreakdownStructure ElementID 53408 entity has a cardinality of one 53410 meaning that for each instance of the ProjectWorkBreakdownStructureElementAttachmentByWorkBreakdownStructureElementIDQueryMessage 53402 entity there is one ProjectWorkBreakdownStructureElementAttachmentSelectionByWorkBreakdownStructure ElementID 53408 entity. The ProjectWorkBreakdownStructureElementAttachmentSelectionByWorkBreakdownStructure ElementID 53408 entity includes a ProjectWorkBreakdownStructureElementID 53412 attribute.

The ProjectWorkBreakdownStructureElementID 53412 attribute is a ProjectWorkBreakdownStructureElementID 53416 datatype. The ProjectWorkBreakdownStructureElementID 53412 attribute has a cardinality of one 53414 meaning that for each instance of the ProjectWorkBreakdownStructureElementAttachmentSelectionByWorkBreakdownStructure ElementID 53408 entity there is one ProjectWorkBreakdownStructureElementID 53412 attribute.

Selection Package

The selection package collects all the selection criteria for work breakdown structure attachment.

ProjectWorkBreakdownStructureElementAttachmentSelectionByWorkBreakdownStructureElementID The ProjectWorkBreakdownStructureElementAttachmentSelectionByWorkBreakdownStructure ElementID contains the selection criteria for work breakdown structure attachment.

Message Data Type

The message data type ProjectWorkBreakdownStructureElementAttachmentByWorkBreakdownStructureElementIDResponseMessage_sync contains the project included in the business document and the Log. FIGS. 535-1 through 535-2 show a ProjectWorkBreakdownStructureElementAttachmentByWorkBreakdownStructureElementIDResponse 53500 package. The ProjectWorkBreakdownStructureElementAttachmentByWorkBreakdownStructureElementIDResponse 53500 package is a ProjectWorkBreakdownStructureElementAttachmentByWorkBreakdownStructureElementIDResponseMessage 53504 datatype. The ProjectWorkBreakdownStructureElementAttachmentByWorkBreakdownStructureElementIDResponse 53500 package includes a ProjectWorkBreakdownStructureElementAttachmentByWorkBreakdownStructureElementIDResponseMessage 53502 entity. The ProjectWorkBreakdownStructureElementAttachmentByWorkBreakdownStructureElementIDResponse 53500 package includes various packages, namely Project 53506 and Log 53556.

The Project 53506 package includes a Project 53508 entity.

The Project 53508 entity has a cardinality of zero or one 53510 meaning that for each instance of the ProjectWorkBreakdownStructureElementAttachmentByWorkBreakdownStructureElementIDResponseMessage 53502 entity there may be one Project 53508 entity. The Project 53508 entity includes an ID 53512 attribute. The Project 53508 entity includes a WorkBreakdownStructureElement 53518 subordinate entity.

The ID 53512 attribute is a ProjectID 53516 datatype. The ID 53512 attribute has a cardinality of one 53514 meaning that for each instance of the Project 53508 entity there is one ID 53512 attribute.

The WorkBreakdownStructureElement 53518 entity has a cardinality of zero or one 53520 meaning that for each instance of the Project 53508 entity there may be one WorkBreakdownStructureElement 53518 entity. The WorkBreakdownStructureElement 53518 entity includes an ID 53522 attribute. The WorkBreakdownStructureElement 53518 entity includes an Attachment 53528 subordinate entity.

The ID 53522 attribute is a ProjectWorkBreakdownStructureElementID 53526 datatype. The ID 53522 attribute has a cardinality of one 53524 meaning that for each instance of the WorkBreakdownStructureElement 53518 entity there is one ID 53522 attribute.

The Attachment 53528 entity has a cardinality of zero or n 53530 meaning that for each instance of the WorkBreakdownStructureElement 53518 entity there may be one or more Attachment 53528 entities. The Attachment 53528 entity includes various attributes, namely Name 53532, AlternativeDocumentID 53538, TypeCode 53544 and VersionID 53550.

The Name 53532 attribute is a LANGUAGEINDEPENDENT_EXTENDED_Name 53536 datatype. The Name 53532 attribute has a cardinality of one 53534 meaning that for each instance of the Attachment 53528 entity there is one Name 53532 attribute.

The AlternativeDocumentID 53538 attribute is an AlternativeDocumentID 53542 datatype. The AlternativeDocumentID 53538 attribute has a cardinality of one 53540 meaning that for each instance of the Attachment 53528 entity there is one AlternativeDocumentID 53538 attribute.

The TypeCode 53544 attribute is a DocumentTypeCode 53548 datatype. The TypeCode 53544 attribute has a cardinality of one 53546 meaning that for each instance of the Attachment 53528 entity there is one TypeCode 53544 attribute.

The VersionID 53550 attribute is a VersionID 53554 datatype. The VersionID 53550 attribute has a cardinality of one 53552 meaning that for each instance of the Attachment 53528 entity there is one VersionID 53550 attribute.

The Log 53556 package is a Log 53562 datatype. The Log 53556 package includes a Log 53558 entity.

The Log 53558 entity has a cardinality of one 53560 meaning that for each instance of the ProjectWorkBreakdownStructureElementAttachmentByWorkBreakdownStructureElementIDResponseMessage 53502 entity there is one Log 53558 entity.

Project Package

Project package groups all the information pertaining to a project.

Project

Project is a business undertaking with a defined goal that is to be attained in a specified time frame. It is to be achieved using predefined funds and planned resources, while reaching an agreed quality level. The project is characterized by the fact that it is unique and that it involves an element of risk.

Task Package

Task Package groups the task with its entities.

WorkBreakdownStructureElement

The task is an individual structural element in a work breakdown structure (WBS) representing the hierarchical organization of a project. It describes either a concrete task (work package) or a summary task that can be further subdivided. WBS Elements have start and end dates and can be scheduled. They do not have a duration or can be used to plan work or resources. They reflect monetary controlling issues and can be used for cost planning and budgeting as well as for revenue calculation.

As task it can have parent relation to ProjectDefinition task, parent and child relation(s) to WorkBreakdownStructureElement task(s) and child relation(s) to Activity(s).

Project Change Interfaces

Due to various factors affecting the time, scope and budget of a project, a Project Manager has to apply for a variance from the original project plan. The Project Manager then creates a ProjectChange which documents and tracks; for the Project stakeholders; the variance, its causes, the parties involved and any follow up tasks and activities required.

Message Choreography

The message choreography of FIG. 540 describes a possible logical sequence of messages that can be used to realize a project change business scenario.

A ProjectChangeCreateRequest_sync is a request to Project Processing to create a ProjectChange. The structure of the message type ProjectChangeCreateRequest_sync is specified by the message data type ProjectChangeCreateRequestMessage_sync.

A ProjectChangeCreateConfirmation_sync is a confirmation from Project Processing for ProjectChangeCreateRequest_sync. The structure of the message type ProjectChangeCreateConfirmation_sync is specified by the message data type ProjectChangeCreateConfirmationMessage_sync.

For example, a “Project Manager” system 540002 can request to create a project change using a ProjectChangeCreateRequest_sync message 540006 as shown, for example, in FIG. 542. A “Project processing” system 540004 can confirm the request using a ProjectChangeCreateConfirmation_sync message 540008 as shown, for example, in FIG. 541.

The message data type ProjectChangeCreateRequestMessage contains the business information that is relevant for sending a business document in a message and the ProjectChange included in the business document. It contains the packages MessageHeader Package and ProjectChange Package. FIGS. 544-1 through 544-9 show a ProjectChangeCreateRequestMessage 544000 package. The ProjectChangeCreateRequestMessage 544000 package is a ProjectChangeMessage 544004 datatype. The ProjectChangeCreateRequestMessage 544000 package includes a ProjectChangeCreateRequestMessage 544002 entity. The ProjectChangeCreateRequestMessage 544000 package includes various packages, namely MessageHeader 544006 and ProjectChange 544014.

The MessageHeader 544006 package is a BasicBusinessDocumentMessageHeader 544012 datatype. The MessageHeader 544006 package includes a MessageHeader 544008 entity.

The MessageHeader 544008 entity has a cardinality of zero or one 544010 meaning that for each instance of the ProjectChangeCreateRequestMessage 544002 entity there may be one MessageHeader 544008 entity.

The ProjectChange 544014 package includes a ProjectChange 544016 entity. The ProjectChange 544014 package includes various packages, namely Task 5440188, Activity 5440248, BusinessTransactionDocumentReference 5440298 and Party 5440316.

The ProjectChange 544016 entity has a cardinality of one 544018 meaning that for each instance of the ProjectChangeCreateRequestMessage 544002 entity there is one ProjectChange 544016 entity. The ProjectChange 544016 entity includes various attributes, namely ProjectWorkBreakdownStructureElementID 544020, IssueProjectIssueCategoryCatalogueID 544026, ParentIssueProjectIssueCategoryID 544032, IssueProjectIssueCategoryID 544038, MiscellaneousProjectIssueCategoryCatalogueID 544044, ParentIMiscellaneousProjectIssueCategoryID 544050, MiscellaneousProjectIssueCategoryID 544056, CauseProjectIssueCategoryCatalogueID 544062, ParentCauseProjectIssueCategoryID 544068, CauseProjectIssueCategoryID 544074, CauseDescription 544080, ReporterInternalID 544086, ReportedDateTime 544092, TypeCode 544098, ImportanceCode 5440104, ApprovalProbabilityCode 5440110, EstimatedCost 5440116, RequestedCost 5440122, AcceptedCost 5440128, ReferenceNumberComment 5440134, Description 5440140, CauseDetailedText 5440146, OperationDetailedText 5440152, ConsequencesDetailedText 5440158, EvaluationDetailedText 5440164, CompanyCode 5440170, CurrencyCode 5440176 and DetailedText 5440182.

The ProjectWorkBreakdownStructureElementID 544020 attribute is a ProjectWorkBreakdownStructureElementID 544024 datatype. The ProjectWorkBreakdownStructureElementID 544020 attribute has a cardinality of zero or one 544022 meaning that for each instance of the ProjectChange 544016 entity there may be one ProjectWorkBreakdownStructureElementID 544020 attribute.

The IssueProjectIssueCategoryCatalogueID 544026 attribute is a ProjectIssueCategoryCatalogueID 544030 datatype. The IssueProjectIssueCategoryCatalogueID 544026 attribute has a cardinality of zero or one 544028 meaning that for each instance of the ProjectChange 544016 entity there may be one IssueProjectIssueCategoryCatalogueID 544026 attribute.

The ParentIssueProjectIssueCategoryID 544032 attribute is a ProjectIssueCategoryID 544036 datatype. The ParentIssueProjectIssueCategoryID 544032 attribute has a cardinality of zero or one 544034 meaning that for each instance of the ProjectChange 544016 entity there may be one ParentIssueProjectIssueCategoryID 544032 attribute.

The IssueProjectIssueCategoryID 544038 attribute is a ProjectIssueCategoryID 544042 datatype. The IssueProjectIssueCategoryID 544038 attribute has a cardinality of zero or one 544040 meaning that for each instance of the ProjectChange 544016 entity there may be one IssueProjectIssueCategoryID 544038 attribute.

The MiscellaneousProjectIssueCategoryCatalogueID 544044 attribute is a ProjectIssueCategoryCatalogueID 544048 datatype. The MiscellaneousProjectIssueCategoryCatalogueID 544044 attribute has a cardinality of zero or one 544046 meaning that for each instance of the ProjectChange 544016 entity there may be one MiscellaneousProjectIssueCategoryCatalogueID 544044 attribute.

The ParentIMiscellaneousProjectIssueCategoryID 544050 attribute is a ProjectIssueCategoryID 544054 datatype. The ParentIMiscellaneousProjectIssueCategoryID 544050 attribute has a cardinality of zero or one 544052 meaning that for each instance of the ProjectChange 544016 entity there may be one ParentIMiscellaneousProjectIssueCategoryID 544050 attribute.

The MiscellaneousProjectIssueCategoryID 544056 attribute is a ProjectIssueCategoryID 544060 datatype. The MiscellaneousProjectIssueCategoryID 544056 attribute has a cardinality of zero or one 544058 meaning that for each instance of the ProjectChange 544016 entity there may be one MiscellaneousProjectIssueCategoryID 544056 attribute.

The CauseProjectIssueCategoryCatalogueID 544062 attribute is a ProjectIssueCategoryCatalogueID 544066 datatype. The CauseProjectIssueCategoryCatalogueID 544062 attribute has a cardinality of zero or one 544064 meaning that for each instance of the ProjectChange 544016 entity there may be one CauseProjectIssueCategory-CatalogueID 544062 attribute.

The ParentCauseProjectIssueCategoryID 544068 attribute is a ProjectIssueCategoryID 544072 datatype. The Parent-CauseProjectIssueCategoryID 544068 attribute has a cardinality of zero or one 544070 meaning that for each instance of the ProjectChange 544016 entity there may be one Parent-CauseProjectIssueCategoryID 544068 attribute.

The CauseProjectIssueCategoryID 544074 attribute is a ProjectIssueCategoryID 544078 datatype. The CauseProjectIssueCategoryID 544074 attribute has a cardinality of zero or one 544076 meaning that for each instance of the ProjectChange 544016 entity there may be one CauseProjectIssueCategoryID 544074 attribute.

The CauseDescription 544080 attribute is a SHORT_Description 544084 datatype. The CauseDescription 544080 attribute has a cardinality of zero or one 544082 meaning that for each instance of the ProjectChange 544016 entity there may be one CauseDescription 544080 attribute.

The ReporterInternalID 544086 attribute is a PartyInternalID 544090 datatype. The ReporterInternalID 544086 attribute has a cardinality of zero or one 544088 meaning that for each instance of the ProjectChange 544016 entity there may be one ReporterInternalID 544086 attribute.

The ReportedDateTime 544092 attribute is a TIMEZONEINDEPENDENT_DateTime 544096 datatype. The ReportedDateTime 544092 attribute has a cardinality of zero or one 544094 meaning that for each instance of the ProjectChange 544016 entity there may be one ReportedDateTime 544092 attribute.

The TypeCode 544098 attribute is a ProjectChangeTypeCode 5440102 datatype. The TypeCode 544098 attribute has a cardinality of one 5440100 meaning that for each instance of the ProjectChange 544016 entity there is one TypeCode 544098 attribute.

The ImportanceCode 5440104 attribute is an ImportanceCode 5440108 datatype. The ImportanceCode 5440104 attribute has a cardinality of zero or one 5440106 meaning that for each instance of the ProjectChange 544016 entity there may be one ImportanceCode 5440104 attribute.

The ApprovalProbabilityCode 5440110 attribute is a ProjectChangeApprovalProbabilityCode 5440114 datatype. The ApprovalProbabilityCode 5440110 attribute has a cardinality of zero or one 5440112 meaning that for each instance of the ProjectChange 544016 entity there may be one ApprovalProbabilityCode 5440110 attribute.

The EstimatedCost 5440116 attribute is an Amount 5440120 datatype. The EstimatedCost 5440116 attribute has a cardinality of zero or one 5440118 meaning that for each instance of the ProjectChange 544016 entity there may be one EstimatedCost 5440116 attribute.

The RequestedCost 5440122 attribute is an Amount 5440126 datatype. The RequestedCost 5440122 attribute has a cardinality of zero or one 5440124 meaning that for each instance of the ProjectChange 544016 entity there may be one RequestedCost 5440122 attribute.

The AcceptedCost 5440128 attribute is an Amount 5440132 datatype. The AcceptedCost 5440128 attribute has a cardinality of zero or one 5440130 meaning that for each instance of the ProjectChange 544016 entity there may be one AcceptedCost 5440128 attribute.

The ReferenceNumberComment 5440134 attribute is a LEN20_Comment 5440138 datatype. The ReferenceNumberComment 5440134 attribute has a cardinality of zero or one 5440136 meaning that for each instance of the ProjectChange 544016 entity there may be one ReferenceNumberComment 5440134 attribute.

The Description 5440140 attribute is a SHORT Description 5440144 datatype. The Description 5440140 attribute has a cardinality of zero or one 5440142 meaning that for each instance of the ProjectChange 544016 entity there may be one Description 5440140 attribute.

The CauseDetailedText 5440146 attribute is a Text 5440150 datatype. The CauseDetailedText 5440146 attribute has a cardinality of zero or one 5440148 meaning that for each instance of the ProjectChange 544016 entity there may be one CauseDetailedText 5440146 attribute.

The OperationDetailedText 5440152 attribute is a Text 5440156 datatype. The OperationDetailedText 5440152 attribute has a cardinality of zero or one 5440154 meaning that for each instance of the ProjectChange 544016 entity there may be one OperationDetailedText 5440152 attribute.

The ConsequencesDetailedText 5440158 attribute is a Text 5440162 datatype. The ConsequencesDetailedText 5440158 attribute has a cardinality of zero or one 5440160 meaning that for each instance of the ProjectChange 544016 entity there may be one ConsequencesDetailedText 5440158 attribute.

The EvaluationDetailedText 5440164 attribute is a Text 5440168 datatype. The EvaluationDetailedText 5440164 attribute has a cardinality of zero or one 5440166 meaning that for each instance of the ProjectChange 544016 entity there may be one EvaluationDetailedText 5440164 attribute.

The CompanyCode 5440170 attribute is a CompanyID 5440174 datatype. The CompanyCode 5440170 attribute has a cardinality of zero or one 5440172 meaning that for each instance of the ProjectChange 544016 entity there may be one CompanyCode 5440170 attribute.

The CurrencyCode 5440176 attribute is a CurrencyCode 5440180 datatype. The CurrencyCode 5440176 attribute has a cardinality of zero or one 5440178 meaning that for each instance of the ProjectChange 544016 entity there may be one CurrencyCode 5440176 attribute.

The DetailedText 5440182 attribute is a Text 5440186 datatype. The DetailedText 5440182 attribute has a cardinality of zero or one 5440184 meaning that for each instance of the ProjectChange 544016 entity there may be one DetailedText 5440182 attribute.

The Task 5440188 package includes a Task 5440190 entity.

The Task 5440190 entity has a cardinality of zero or n 5440192 meaning that for each instance of the ProjectChange 544016 entity there may be one or more Task 5440190 entities. The Task 5440190 entity includes various attributes, namely EmployeeResponsibleInternalID 5440194, TaskProjectIssueCategoryCatalogueID 5440200, Parent-TaskProjectIssueCategoryID 5440206, TaskProjectIssueCategoryID 5440212, EmployeeResponsibleInternalTypeCode 5440218, PlannedProcessingPeriod 5440224, Description 5440230, DetailedText 5440236 and OrdinalNumberValue 5440242.

The EmployeeResponsibleInternalID 5440194 attribute is a PartyInternalID 5440198 datatype. The EmployeeResponsibleInternalID 5440194 attribute has a cardinality of zero or one 5440196 meaning that for each instance of the Task 5440190 entity there may be one EmployeeResponsibleInternalID 5440194 attribute.

The TaskProjectIssueCategoryCatalogueID 5440200 attribute is a ProjectIssueCategoryCatalogueID 5440204 datatype. The TaskProjectIssueCategoryCatalogueID 5440200 attribute has a cardinality of zero or one 5440202 meaning that for each instance of the Task 5440190 entity there may be one TaskProjectIssueCategoryCatalogueID 5440200 attribute.

The ParentTaskProjectIssueCategoryID 5440206 attribute is a ProjectIssueCategoryID 5440210 datatype. The ParentTaskProjectIssueCategoryID 5440206 attribute has a cardinality of zero or one 5440208 meaning that for each instance of the Task 5440190 entity there may be one ParentTaskProjectIssueCategoryID 5440206 attribute.

The TaskProjectIssueCategoryID 5440212 attribute is a ProjectIssueCategoryID 5440216 datatype. The TaskProjectIssueCategoryID 5440212 attribute has a cardinality of zero or one 5440214 meaning that for each instance of the Task 5440190 entity there may be one TaskProjectIssueCategoryID 5440212 attribute.

The EmployeeResponsibleInternalTypeCode 5440218 attribute is a BusinessObjectTypeCode 5440222 datatype. The EmployeeResponsibleInternalTypeCode 5440218 attribute has a cardinality of zero or one 5440220 meaning that for each instance of the Task 5440190 entity there may be one EmployeeResponsibleInternalTypeCode 5440218 attribute.

The PlannedProcessingPeriod 5440224 attribute is an UPPEROPEN_TIMEZONEINDEPENDENT_ DateTimePeriod 5440228 datatype. The PlannedProcessingPeriod 5440224 attribute has a cardinality of zero or one 5440226 meaning that for each instance of the Task 5440190 entity there may be one PlannedProcessingPeriod 5440224 attribute.

The Description 5440230 attribute is a SHORT_Description 5440234 datatype. The Description 5440230 attribute has a cardinality of zero or one 5440232 meaning that for each instance of the Task 5440190 entity there may be one Description 5440230 attribute.

The DetailedText 5440236 attribute is a Text 5440240 datatype. The DetailedText 5440236 attribute has a cardinality of zero or one 5440238 meaning that for each instance of the Task 5440190 entity there may be one DetailedText 5440236 attribute.

The OrdinalNumberValue 5440242 attribute is an OrdinalNumberValue 5440246 datatype. The OrdinalNumberValue 5440242 attribute has a cardinality of one 5440244 meaning that for each instance of the Task 5440190 entity there is one OrdinalNumberValue 5440242 attribute.

The Activity 5440248 package is a PriorityCode 5440254 datatype. The Activity 5440248 package includes an Activity 5440250 entity.

The Activity 5440250 entity has a cardinality of zero or n 5440252 meaning that for each instance of the ProjectChange 544016 entity there may be one or more Activity 5440250 entities. The Activity 5440250 entity includes various attributes, namely ActivityProjectIssueCategoryCatalogueID 5440256, ParentActivityProjectIssueCategoryID 5440262, ActivityProjectIssueCategoryID 5440268, ProcessingPeriod 5440274, Description 5440280, DetailedText 5440286 and OrdinalNumberValue 5440292.

The ActivityProjectIssueCategoryCatalogueID 5440256 attribute is a ProjectIssueCategoryCatalogueID 5440260 datatype. The ActivityProjectIssueCategoryCatalogueID 5440256 attribute has a cardinality of zero or one 5440258 meaning that for each instance of the Activity 5440250 entity there may be one ActivityProjectIssueCategoryCatalogueID 5440256 attribute.

The ParentActivityProjectIssueCategoryID 5440262 attribute is a ProjectIssueCategoryID 5440266 datatype. The ParentActivityProjectIssueCategoryID 5440262 attribute has a cardinality of zero or one 5440264 meaning that for each instance of the Activity 5440250 entity there may be one ParentActivityProjectIssueCategoryID 5440262 attribute.

The ActivityProjectIssueCategoryID 5440268 attribute is a ProjectIssueCategoryID 5440272 datatype. The ActivityProjectIssueCategoryID 5440268 attribute has a cardinality of zero or one 5440270 meaning that for each instance of the Activity 5440250 entity there may be one ActivityProjectIssueCategoryID 5440268 attribute.

The ProcessingPeriod 5440274 attribute is an UPPEROPEN_TIMEZONEINDEPENDENT_DateTimePeriod 5440278 datatype. The ProcessingPeriod 5440274 attribute has a cardinality of zero or one 5440276 meaning that for each instance of the Activity 5440250 entity there may be one ProcessingPeriod 5440274 attribute.

The Description 5440280 attribute is a SHORT_Description 5440284 datatype. The Description 5440280 attribute has a cardinality of zero or one 5440282 meaning that for each instance of the Activity 5440250 entity there may be one Description 5440280 attribute.

The DetailedText 5440286 attribute is a Text 5440290 datatype. The DetailedText 5440286 attribute has a cardinality of zero or one 5440288 meaning that for each instance of the Activity 5440250 entity there may be one DetailedText 5440286 attribute.

The OrdinalNumberValue 5440292 attribute is an OrdinalNumberValue 5440296 datatype. The OrdinalNumberValue 5440292 attribute has a cardinality of one 5440294 meaning that for each instance of the Activity 5440250 entity there is one OrdinalNumberValue 5440292 attribute.

The BusinessTransactionDocumentReference 5440298 package includes a BusinessTransactionDocumentReference 5440300 entity.

The BusinessTransactionDocumentReference 5440300 entity has a cardinality of zero or one 5440302 meaning that for each instance of the ProjectChange 544016 entity there may be one BusinessTransactionDocumentReference 5440300 entity. The BusinessTransactionDocumentReference 5440300 entity includes various attributes, namely SalesOrderReference 5440304 and DeliveryReference 5440310.

The SalesOrderReference 5440304 attribute is a BusinessTransactionDocumentReference 5440308 datatype. The SalesOrderReference 5440304 attribute has a cardinality of zero or one 5440306 meaning that for each instance of the BusinessTransactionDocumentReference 5440300 entity there may be one SalesOrderReference 5440304 attribute.

The DeliveryReference 5440310 attribute is a BusinessTransactionDocumentReference 5440314 datatype. The DeliveryReference 5440310 attribute has a cardinality of zero or one 5440312 meaning that for each instance of the BusinessTransactionDocumentReference 5440300 entity there may be one DeliveryReference 5440310 attribute.

The Party 5440316 package includes a Party 5440318 entity.

The Party 5440318 entity has a cardinality of zero or n 5440320 meaning that for each instance of the ProjectChange 544016 entity there may be one or more Party 5440318 entities. The Party 5440318 entity has various subordinate entities, namely BuyerParty 5440322, VendorParty 5440332 and Party 5440342.

The BuyerParty 5440322 entity has a cardinality of zero or one 5440324 meaning that for each instance of the Party 5440318 entity there may be one BuyerParty 5440322 entity. The BuyerParty 5440322 entity includes an InternalID 5440326 attribute.

The InternalID 5440326 attribute is a PartyInternalID 5440330 datatype. The InternalID 5440326 attribute has a cardinality of one 5440328 meaning that for each instance of the BuyerParty 5440322 entity there is one InternalID 5440326 attribute.

The VendorParty 5440332 entity has a cardinality of zero or one 5440334 meaning that for each instance of the Party 5440318 entity there may be one VendorParty 5440332 entity. The VendorParty 5440332 entity includes an InternalID 5440336 attribute.

The InternalID 5440336 attribute is a PartyInternalID 5440340 datatype. The InternalID 5440336 attribute has a cardinality of one 5440338 meaning that for each instance of the VendorParty 5440332 entity there is one InternalID 5440336 attribute.

The Party 5440342 entity has a cardinality of zero or one 5440344 meaning that for each instance of the Party 5440318 entity there may be one Party 5440342 entity. The Party 5440342 entity includes various attributes, namely InternalID 5440346 and RoleCode 5440352.

The InternalID 5440346 attribute is a PartyInternalID 5440350 datatype. The InternalID 5440346 attribute has a cardinality of one 5440348 meaning that for each instance of the Party 5440342 entity there is one InternalID 5440346 attribute.

The RoleCode 5440352 attribute is a PartyRoleCode 5440356 datatype. The RoleCode 5440352 attribute has a cardinality of one 5440354 meaning that for each instance of the Party 5440342 entity there is one RoleCode 5440352 attribute.

MessageHeader Package

A MessageHeader package groups the business information that is relevant for sending a business document in a message. It contains the entity MessageHeader.

MessageHeader

A MessageHeader groups business information from the perspective of the sending application: Information to identify the business document in a message. The MessageHeader is of type GDT: BasicBusinessDocumentMessageHeader, whereby the following elements of the GDT are used: ID, ReferenceID, UUID, ReferenceUUID.

ProjectChange Package

A ProjectChange package groups all the information pertaining to a ProjectChange.

ProjectChange

A ProjectChange is a business document which allows the documentation and tracking of variances in time, budget and scope of a project for visibility to project stakeholders.

The elements located at the ProjectChange are ProjectWorkBreakdownStructureElementID, TypeCode, ImportanceCode, IssueProjectIssueCategoryCatalogueID, ParentIssueProjectIssueCategoryID, IssueProjectIssueCategoryID, MiscellaneousProjectIssueCategoryCatalogueID, ParentIMiscellaneousProjectIssueCategoryID, MiscellaneousProjectIssueCategoryID, CauseProjectIssueCategoryCatalogueID, ParentCauseProjectIssueCategoryID, CauseProjectIssueCategoryID, CauseDescription, ReporterInternalID, ReportedDateTime, ReferenceNumberComment, CompanyCode, CurrencyCode, ApprovalProbabilityCode, Description, EstimatedCost, RequestedCost, AcceptedCost, and Comment. It contains packages Task, Activity, Party, and BusinessTransactionDocumentReference.

The ProjectWorkBreakdownStructureElementID, which can be optional, identifies a project work breakdown structure element. It is of type GDT: ProjectWorkBreakdownStructureElementID. TypeCode is a coded representation of the type of a project change. It is of type GDT: ProjectChangeTypeCode. ImportanceCode, which can be optional, is a coded representation of the processing priority of a project change. It is of type GDT: ImportanceCode. IssueProjectIssueCategoryCatalogueID, which can be optional, is of type GDT: ProjectIssueCategoryCatalogueID. ParentIssueProjectIssueCategoryID, which can be optional, is of type GDT: ProjectIssueCategoryID. IssueProjectIssueCategoryID, which can be optional, is of type GDT: ProjectIssueCategoryID. MiscellaneousProjectIssueCategoryCatalogueID, which can be Optional, is of type GDT: ProjectIssueCategoryCatalogueID. ParentIMiscellaneousProjectIssueCategoryID, which can be optional, is of type GDT: ProjectIssueCategoryID. MiscellaneousProjectIssueCategoryID, which can be optional, is of type GDT: ProjectIssueCategoryID. CauseProjectIssueCategoryCatalogueID, which can be optional, is of type GDT: ProjectIssueCategoryCatalogueID. ParentCauseProjectIssueCategoryID, which can be optional, is of type GDT: ProjectIssueCategoryID. CauseProjectIssueCategoryID, which can be optional, is of type GDT: ProjectIssueCategoryID. CauseDescription, which can be optional, is of type GDT: SHORT_Description. ReporterInternalID, which can be optional, is of type GDT: PartyInternalID. ReportedDateTime, can be optional, is of type GDT: TIMEZONEINDEPENDENT_DateTime. ReferenceNumberComment, which can be optional, is of type GDT: LEN20_Comment.CompanyCode, which can be optional, is of type GDT: CompanyID. CurrencyCode, which can be optional, is of type GDT: CurrencyCode. ApprovalProbabilityCode, which can be optional, is a coded representation of the probability of a project change being approved. It is of type GDT: ProjectChangeApprovalProbabilityCode. Description, which can be optional, is a description of a project change. It is of type GDT: SHORT_Description; Qualifier: ProjectChange. EstimatedCost, which can be optional, is an estimated cost which is typically the result of a high level cost calculation or a detail cost calculation and is the real cost due to a project change. It is of type GDT—Amount: Qualifier EstimatedCost. RequestedCost, which can be optional, are more or less the minimal cost the companies expected to get from the customer for a project change. It is of type GDT—Amount: Qualifier RequestedCost. AcceptedCost, which can be optional, is costs accepted for a project change by partner. It is of type GDT—Amount: Qualifier AcceptedCost. Comment, which can be optional, may contain an additional description for a project change and can be entered. It is of type GDT: LEN20_Comment; Qualifier: ProjectChange.

Party Package

A Party package groups the Party related information. It contains the entity BuyerParty, VendorParty, and Party.

BuyerParty

A BuyerParty is a business partner to whom materials or services are offered or provided. The InternalID is an identifier for a party. It is of type GDT: PartyInternalID.

VendorParty

A VendorParty is a business partner who offers or provides materials or services. Its structure is InternalID and is an identifier for a party. It is of type GDT: PartyInternalID.

Party

A Party is a natural person, organization, or group that is somehow related to a ProjectChange. Further parties may be added here. It contains InternalID and FormattedName. The InternalID is an identifier for a party and is of type GDT: PartyInternalID. The FormattedName is the complete, formatted name of a party and is of type GDT: LONG_Name; Qualifier: PartyFormatted.

BusinessTransactionDocumentReference Package

A BusinessTransactionDocumentReference is a reference to sales order, purchase order and delivery. It contains the entity SalesOrderReference and DeliveryReference.

SalesOrderReference

A SalesOrderReference is an agreement between a seller and a customer regarding the sale and delivery of goods associated with this at a certain time, for a certain quantity and at a certain price. It contains the element SalesOrderReference which may be optional. SalesOrderReference is the identifier for a sales order and is of type GDT: BusinessTransactionDocumentReference.

DeliveryReference

A DeliverReference references a delivery. It contains the element DeliveryReference, which can be optional and is the identifier for a Delivery. It is of type GDT: BusinessTransactionDocumentReference.

Task Package

A Task package groups the task related information. It contains the entity Task.

Task

A Task in a project change is an action which is required to rectify all problems and defects found in a project. It contains the elements OrdinalNumberValue, PlannedProcessingPeriod, EmployeeResponsibleInternalID, TaskProjectIssueCategoryCatalogueID, ParentTaskProjectIssueCategoryID, TaskProjectIssueCategoryID, ParentProjectIssueCategoryID, EmployeeResponsibleInternalTypeCode, PlannedProcessingPeriod, ProjectIssueCategoryID, Description, and DetailedText.

OrdinalNumberValue identifies the position of a task in a sorted list. It is of type GDT: OrdinalNumberValue. PlannedProcessingPeriod, which can be optional, is the period during which a task is planned. It is of type GDT: UPPEROPEN_TIMEZONEINDEPENDENT_DateTimePeriod; Qualifier: Processing. EmployeeResponsibleInternalID, which can be optional, is of type GDT: PartyInternalID. TaskProjectIssueCategoryCatalogueID, which can be optional, is an identifier of a project issue category catalogue of type Task. It is of type GDT: ProjectIssueCategoryCatalogueID. ParentTaskProjectIssueCategoryID, which can be optional, is of type GDT: ProjectIssueCategoryID. TaskProjectIssueCategoryID, which can be optional, is of type GDT: ProjectIssueCategoryID. ParentProjectIssueCategoryID, which can be optional, is an identifier of a parent category of type Task. It is of type GDT: ProjectIssueCategoryID; Qualifier: Parent. EmployeeResponsibleInternalTypeCode, which can be optional, is of type GDT: BusinessObjectTypeCode. PlannedProcessingPeriod, which can be optional, is of type GDT: UPPEROPEN_TIMEZONEINDEPENDENT_DateTimePeriod. ProjectIssueCategoryID, which can be optional, is an identifier of a category of type Task. It is of type GDT: ProjectIssueCategoryID. Description, which can be optional, is a description for a task. It is of type GDT: SHORT_Description; Qualifier: Task. DetailedText, which can be optional, is detailed text for a task. It is of type GDT: Text.

Activity

An Activity package groups the activity related information. It contains the entity Activity. An Activity is a short-term action that shall be executed immediately to rectify all problems or defects found in project change. It contains the elements OrdinalNumberValue, PlannedProcessingPeriod, ActivityProjectIssueCategoryCatalogueID, ParentActivityProjectIssueCategoryID, ActivityProjectIssueCategoryID, Description, and DetailedText.

OrdinalNumberValue identifies the position of a task in a sorted list. It is of type GDT: OrdinalNumberValue. PlannedProcessingPeriod, which can be optional, is the period during which a task is planned. It is of type GDT: UPPEROPEN_TIMEZONEINDEPENDENT_DateTimePeriod; Qualifier: Processing ActivityProjectIssueCategoryCatalogueID, which can be optional, is an identifier of a project issue category catalogue of type Task. It is of type GDT: ProjectIssueCategoryCatalogueID. ParentActivityProjectIssueCategoryID, which can be optional, is an identifier of a parent category of type Task. It is of type GDT: ProjectIssueCategoryID; Qualifier: Parent. ActivityProjectIssueCategoryID, which can be optional, is an identifier of a category of type Task. It is of type GDT: ProjectIssueCategoryID. Description, which can be optional, is a description for a task. It is of type GDT: SHORT_Description; Qualifier: Task. DetailedText, which can be optional, is detailed text for a task. It is of type GDT: Text.

Message Data Type

The message data type ProjectChangeCreateConfirmationMessage contains the business information that is relevant for sending a business document in a message, the ProjectChange included in the business document, and the Log. It contains the packages MessageHeader package, ProjectChange package, and Log package. FIG. 543 shows a ProjectChangeCreateConfirmationMessage 543000 package. The ProjectChangeCreateConfirmationMessage 543000 package is a ProjectChangeMessage 543004 datatype. The ProjectChangeCreateConfirmationMessage 543000 package includes a ProjectChangeCreateConfirmationMessage 543002 entity. The ProjectChangeCreateConfirmationMessage 543000 package includes various packages, namely MessageHeader 543006, ProjectChange 543014 and Log 543026.

The MessageHeader 543006 package is a BasicBusinessDocumentMessageHeader 543012 datatype. The MessageHeader 543006 package includes a MessageHeader 543008 entity.

The MessageHeader 543008 entity has a cardinality of zero or one 543010 meaning that for each instance of the ProjectChangeCreateConfirmationMessage 543002 entity there may be one MessageHeader 543008 entity.

The ProjectChange 543014 package includes a ProjectChange 543016 entity.

The ProjectChange 543016 entity has a cardinality of zero or one 543018 meaning that for each instance of the ProjectChangeCreateConfirmationMessage 543002 entity there may be one ProjectChange 543016 entity. The ProjectChange 543016 entity includes an ID 543020 attribute.

The ID 543020 attribute is a ProjectChangeID 543024 datatype. The ID 543020 attribute has a cardinality of one 543022 meaning that for each instance of the ProjectChange 543016 entity there is one ID 543020 attribute.

The Log 543026 package is a Log 543032 datatype. The Log 543026 package includes a Log 543028 entity.

The Log 543028 entity has a cardinality of one 543030 meaning that for each instance of the ProjectChangeCreateConfirmationMessage 543002 entity there is one Log 543028 entity.

ProjectChange Package

A ProjectChangepackage groups the ProjectChange.

ProjectChange

A Project Change is a business document which allows the documentation and tracking of variances in time, budget and scope of a project for visibility to project stakeholders.

The element located directly at the ProjectChange is ID. ID, which may be optional, identifies a Project Change.

Log Package

A Log package groups the error messages used for user interaction. It contains the entity Log.

Log Entity

A Log is a sequence of messages that result when an application executes a task.

ProjectIssueCategoryCatalogue Interfaces

A project manager has a project with clearly communicated and documented scope, time and budget. Due to a specific event the scope needs to be changed. Therefore he creates a ProjectChange. With the help of the categories of the project issue category catalogue he specifies standard reasons for this ProjectChange.

Message Choreography

The message choreography of FIG. 545 describes a possible logical sequence of messages that can be used to realize a project issue category catalogue business scenario.

A ProjectIssueCategoryCatalogueSimpleByProfileProjectChangeTypeCodeQuery_sync is an inquiry to ProjectMasterDataManagement for a ProjectIssueCategoryCatalogueSimple. The structure of the message type ProjectIssueCategoryCatalogueSimpleByProfileProjectChangeTypeCodeQuery_sync is specified by the message data type ProjectIssueCategoryCatalogueSimpleByProfileProjectChangeTypeCodeQueryMessage_sync.

A ProjectIssueCategoryCatalogueSimpleByProfileProjectChangeTypeCodeResponse_sync is the response to ProjectIssueCategoryCatalogueSimpleByProfileProjectChangeTypeCodeQuery_sync. The structure of the message type ProjectIssueCategoryCatalogueSimpleByProfileProjectChangeTypeCodeResponse_sync is specified by the message data type ProjectIssueCategoryCatalogueSimpleByProfileProjectChangeTypeCodeResponseMessage_sync.

A ProjectIssueCategoryCatalogueCategoryByIDQuery_sync is an inquiry to ProjectMasterDataManagement for a ProjectIssueCategoryCatalogueCategory. The structure of the message type ProjectIssueCategoryCatalogueCategoryByIDQuery_sync is specified by the message data type ProjectIssueCategoryCatalogueCategoryByIDQueryMessage_sync.

ProjectIssueCategoryCatalogueCategoryByIDResponse_sync

A ProjectIssueCategoryCatalogueCategoryByIDResponse_sync is the response to ProjectIssueCategoryCatalogueCategoryByIDQuery_sync. The structure of the message type ProjectIssueCategoryCatalogueCategoryByIDResponse_sync is specified by the message data type ProjectIssueCategoryCatalogueCategoryByIDResponseMessage_sync.

For example, a "Project Manager" system 545002 can query project issue category catalogues by profile project change type code using the ProjectIssueCategoryCatalogueSimpleByProfileProjectChangeTypeCodeQuery_sync message 545006 as shown, for example, in FIG. 548. A "Project Master Data Management" system 545004 can respond to the query using the ProjectIssueCategoryCatalogueSimpleByProfileProjectChangeTypeCodeResponse_sync message 545008 as shown, for example, in FIG. 549. The "Project Manager" system 545002 can query project issue category catalogues by ID using the ProjectIssueCategoryCatalogueCategoryByIDQuery_sync message 545010 as shown, for example, in FIG. 546. The "Project Master Data Management" system 545004 can respond to the query using the ProjectIssueCategoryCatalogueCategoryByIDResponse_sync message 545012 as shown, for example, in FIG. 547.

Message Data Type

FIG. 552 shows a ProjectIssueCategoryCatalogueSimpleByProfileProjectChangeTypeCodeQueryMessage_sync 552000 package. The ProjectIssueCategoryCatalogueSimpleByProfileProjectChangeTypeCodeQueryMessage_sync 552000 package is a ProjectIssueCategoryCatalogueSimpleByProfileProjectChangeTypeCodeQueryMessage_sync 552004 datatype. The ProjectIssueCategoryCatalogueSimpleByProfileProjectChangeTypeCodeQueryMessage_sync 552000 package includes a ProjectIssueCategoryCatalogueSimpleByProfileProjectChangeTypeCodeQueryMessage_sync 552002 entity. The ProjectIssueCategoryCatalogueSimpleByProfileProjectChangeTypeCodeQueryMessage_sync 552000 package includes a Selection 552006 package.

The Selection 552006 package is a ProjectIssueCategoryCatalogueSimpleSelectionByProfileProjectChangeTypeCode 552012 datatype. The Selection 552006 package includes a ProjectIssueCategoryCatalogueSimpleSelectionByProfileProjectChangeTypeCode 552008 entity.

The ProjectIssueCategoryCatalogueSimpleSelectionByProfileProjectChangeTypeCode 552008 entity has a cardinality of one 552010 meaning that for each instance of the ProjectIssueCategoryCatalogueSimpleByProfileProjectChangeTypeCodeQueryMessage_sync 552002 entity there is one ProjectIssueCategoryCatalogueSimpleSelectionByProfileProjectChangeTypeCode 552008 entity. The ProjectIssueCategoryCatalogueSimpleSelectionByProfileProjectChangeTypeCode 552008 entity includes various attributes, namely ProfileProjectChangeTypeCode 552014 and LanguageCode 552020.

The ProfileProjectChangeTypeCode 552014 attribute is a ProjectChangeTypeCode 552018 datatype. The ProfileProjectChangeTypeCode 552014 attribute has a cardinality of one 552016 meaning that for each instance of the ProjectIssueCategoryCatalogueSimpleSelectionByProfileProjectChangeTypeCode 552008 entity there is one ProfileProjectChangeTypeCode 552014 attribute.

The LanguageCode 552020 attribute is a LanguageCode 552024 datatype. The LanguageCode 552020 attribute has a cardinality of zero or one 552022 meaning that for each instance of the ProjectIssueCategoryCatalogueSimpleSelectionByProfileProjectChangeTypeCode 552008 entity there may be one LanguageCode 552020 attribute.

Selection Package

The Selection package collects the selection criteria for ProjectIssueCategoryCatalogueID and the corresponding ProjectIssueCategoryTypeCode.

Message Data Type

FIGS. 553-1 through 553-2 show a ProjectIssueCategoryCatalogueSimpleByProfileProjectChangeTypeCodeResponseMessage_sync 553000 package. The ProjectIssueCategoryCatalogueSimpleByProfileProjectChangeTypeCodeResponseMessage_sync 553000 package is a ProjectIssueCategoryCatalogueSimpleByProfileProjectChangeTypeCodeResponseMessage_sync 553004 datatype. The ProjectIssueCategoryCatalogueSimpleByProfileProjectChangeTypeCodeResponseMessage_sync 553000 package includes a ProjectIssueCategoryCatalogueSimpleByProfileProjectChangeTypeCodeResponseMessage__sync 553002 entity. The ProjectIssueCategoryCatalogueSimpleByProfileProjectChangeTypeCodeResponseMessage_sync 553000 package includes various packages, namely ProjectIssueCategoryCatalogue 553006 and Log 553036.

The ProjectIssueCategoryCatalogue 553006 package includes a ProjectIssueCategoryCatalogue 553008 entity.

The ProjectIssueCategoryCatalogue 553008 entity has a cardinality of zero or n 553010 meaning that for each instance of the ProjectIssueCategoryCatalogueSimpleByProfileProjectChangeTypeCodeResponseMessage_sync 553002 entity there may be one or more ProjectIssueCategoryCatalogue 553008 entities. The ProjectIssueCategoryCatalogue 553008 entity includes various attributes, namely ID 553012, ProjectIssueCategoryTypeCode 553018, ProjectIssueCategoryTypeName 553024 and Name 553030.

The ID 553012 attribute is a ProjectIssueCategoryCatalogueID 553016 datatype. The ID 553012 attribute has a cardinality of one 553014 meaning that for each instance of the ProjectIssueCategoryCatalogue 553008 entity there is one ID 553012 attribute.

The ProjectIssueCategoryTypeCode 553018 attribute is a ProjectIssueCategoryCatalogueTypeCode 553022 datatype. The ProjectIssueCategoryTypeCode 553018 attribute has a cardinality of one 553020 meaning that for each instance of the ProjectIssueCategoryCatalogue 553008 entity there is one ProjectIssueCategoryTypeCode 553018 attribute.

The ProjectIssueCategoryTypeName 553024 attribute is a MEDIUM_Name(qualifier:CategoryType) 553028 datatype. The ProjectIssueCategoryTypeName 553024 attribute has a cardinality of zero or one 553026 meaning that for each instance of the ProjectIssueCategoryCatalogue 553008 entity there may be one ProjectIssueCategoryTypeName 553024 attribute.

The Name 553030 attribute is a MEDIUM_Name(qualifier:Catalogue) 553034 datatype. The Name 553030 attribute has a cardinality of zero or one 553032 meaning that for each instance of the ProjectIssueCategoryCatalogue 553008 entity there may be one Name 553030 attribute.

The Log 553036 package is a Log 553042 datatype. The Log 553036 package includes a Log 553038 entity.

The Log 553038 entity has a cardinality of one 553040 meaning that for each instance of the ProjectIssueCategoryCatalogueSimpleByProfileProjectChangeTypeCodeResponseMessage_sync 553002 entity there is one Log 553038 entity.

ProjectIssueCategoryCatalogue Package

The ProjectIssueCategoryCatalogue package groups the project issue category catalogue information.

ProjectIssueCategoryCatalogue

A ProjectIssueCategoryCatalogue is a hierarchically structured catalogue of categories, which classify project-related issues for a particular project aspect. A ProjectIssueCategoryCatalogueID is an identifier for a catalog of categories for project-related issues. A ProjectIssueCategoryCatalogueProjectIssueCategoryTypeCode is the coded representation of the type of a category of a catalogue for project-related issues. For mySAP all categories of a catalogue have the same category type code. ProjectIssueCategoryCatalogueTypeName (optional) is the language dependent name of the project issue category catalogue type code. ProjectIssueCategoryCatalogueName (optional) is the language dependent name of the project issue category catalogue.

Log Package

A Log package groups the error messages used for user interaction

Log

A Log is a sequence of messages that result when an application executes a task.

Message Data Type

FIG. 550 shows a ProjectIssueCategoryCatalogueCategoryByIDQueryMessage_sync 550000 package. The ProjectIssueCategoryCatalogueCategoryByIDQueryMessage_sync 550000 package is a ProjectIssueCategoryCatalogueCategoryByIDQueryMessage_sync 550004 datatype. The ProjectIssueCategoryCatalogueCategoryByIDQueryMessage_sync 550000 package includes a ProjectIssueCategoryCatalogueCategoryByIDQueryMessage_sync 550002 entity. The ProjectIssueCategoryCatalogueCategoryByIDQueryMessage_sync 550000 package includes a Selection 550006 package.

The Selection 550006 package is a ProjectIssueCategoryCatalogueSelectionByID 550012 datatype. The Selection 550006 package includes a ProjectIssueCategoryCatalogueCategorySelectionByID 550008 entity.

The ProjectIssueCategoryCatalogueCategorySelectionByID 550008 entity has a cardinality of one 550010 meaning that for each instance of the ProjectIssueCategoryCatalogueCategoryByIDQueryMessage_sync 550002 entity there is one ProjectIssueCategoryCatalogueCategorySelectionByID 550008 entity. The ProjectIssueCategoryCatalogueCategorySelectionByID 550008 entity includes various attributes, namely ID 550014, CategoryParentProjectIssueCategoryID 550020, ProfileIssueCategoryFilterCode 550026 and LanguageCode 550032.

The ID 550014 attribute is a ProjectIssueCategoryCatalogueID 550018 datatype. The ID 550014 attribute has a cardinality of one 550016 meaning that for each instance of the ProjectIssueCategoryCatalogueCategorySelectionByID 550008 entity there is one ID 550014 attribute.

The CategoryParentProjectIssueCategoryID 550020 attribute is a ProjectIssueCategoryID(qualifier:Parent) 550024 datatype. The CategoryParentProjectIssueCategoryID 550020 attribute has a cardinality of zero or one 550022 meaning that for each instance of the ProjectIssueCategoryCatalogueCategorySelectionByID 550008 entity there may be one CategoryParentProjectIssueCategoryID 550020 attribute.

The ProfileIssueCategoryFilterCode 550026 attribute is an IssueCategoryFilterCode 550030 datatype. The ProfileIssue- CategoryFilterCode 550026 attribute has a cardinality of zero or one 550028 meaning that for each instance of the ProjectIssueCategoryCatalogueCategorySelectionByID 550008 entity there may be one ProfileIssueCategoryFilterCode 550026 attribute.

The LanguageCode 550032 attribute is a LanguageCode 550036 datatype. The LanguageCode 550032 attribute has a cardinality of zero or one 550034 meaning that for each instance of the ProjectIssueCategoryCatalogueCategorySelectionByID 550008 entity there may be one LanguageCode 550032 attribute.

Selection Package

ProjectIssueCategoryCatalogueCategorySelectionByID

ProjectIssueCategoryCatalogueCategorySelectionByID specifies selection criteria to select a ProjectIssueCategoryCatalogueCategory by ProjectIssueCategoryCatalogueID. A ProjectIssueCategoryCatalogueID is an identifier for a catalog of categories for project-related issues. A ProjectIssueCategoryCatalogueProfileIssueCategoryFilterCode (optional) is the coded representation of issue category filter codes for project-related categories. A LanguageCode (optional) is the encoded representation of the default language of the catalogue related name(s) and description(s). If no language code is given the system language will be used as default.

Message Data Type

FIGS. 551-1 through 551-3 show a ProjectIssueCategoryCatalogueCategoryByIDResponseMessage_sync 551000 package. The ProjectIssueCategoryCatalogueCategoryByIDResponseMessage__sync 551000 package is a ProjectIssueCategoryCatalogueMessage_sync 551004 datatype. The ProjectIssueCategoryCatalogueCategoryByIDResponseMessage_sync 551000 package includes a ProjectIssueCategoryCatalogueCategoryByIDResponseMessage_sync 551002 entity. The ProjectIssueCategoryCatalogueCategoryByIDResponseMessage_sync 551000 package includes various packages, namely ProjectIssueCategoryCatalogue 551006 and Log 551066.

The ProjectIssueCategoryCatalogue 551006 package includes a ProjectIssueCategoryCatalogue 551008 entity. The ProjectIssueCategoryCatalogue 551006 package includes a Category 551036 package.

The ProjectIssueCategoryCatalogue 551008 entity has a cardinality of zero or one 551010 meaning that for each instance of the ProjectIssueCategoryCatalogueCategoryByIDResponseMessage_sync 551002 entity there may be one ProjectIssueCategoryCatalogue 551008 entity. The ProjectIssueCategoryCatalogue 551008 entity includes various attributes, namely ID 551012, ProjectIssueCategoryTypeCode 551018, Name 551024 and ProjectIssueCategoryTypeName 551030.

The ID 551012 attribute is a ProjectIssueCategoryCatalogueID 551016 datatype. The ID 551012 attribute has a cardinality of one 551014 meaning that for each instance of the ProjectIssueCategoryCatalogue 551008 entity there is one ID 551012 attribute.

The ProjectIssueCategoryTypeCode 551018 attribute is a ProjectIssueCategoryTypeCode 551022 datatype. The ProjectIssueCategoryTypeCode 551018 attribute has a cardinality of one 551020 meaning that for each instance of the ProjectIssueCategoryCatalogue 551008 entity there is one ProjectIssueCategoryTypeCode 551018 attribute.

The Name 551024 attribute is a MEDIUM_Name(Qualifier:Catalogue) 551028 datatype. The Name 551024 attribute has a cardinality of zero or one 551026 meaning that for each instance of the ProjectIssueCategoryCatalogue 551008 entity there may be one Name 551024 attribute.

The ProjectIssueCategoryTypeName 551030 attribute is a MEDIUM_Name(Qualifier:CategoryType) 551034 datatype. The ProjectIssueCategoryTypeName 551030 attribute has a cardinality of zero or one 551032 meaning that for each instance of the ProjectIssueCategoryCatalogue 551008 entity there may be one ProjectIssueCategoryTypeName 551030 attribute.

The Category 551036 package includes a Category 551038 entity.

The Category 551038 entity has a cardinality of zero or n 551040 meaning that for each instance of the ProjectIssueCategoryCatalogue 551008 entity there may be one or more Category 551038 entities. The Category 551038 entity includes various attributes, namely ProjectIssueCategoryID 551042, ParentProjectIssueCategoryID 551048, ProjectIssueCategoryName 551054 and ProjectIssueCategoryDescription 551060.

The ProjectIssueCategoryID 551042 attribute is a ProjectIssueCategoryID 551046 datatype. The ProjectIssueCategoryID 551042 attribute has a cardinality of one 551044 meaning that for each instance of the Category 551038 entity there is one ProjectIssueCategoryID 551042 attribute.

The ParentProjectIssueCategoryID 551048 attribute is a ProjectIssueCategoryID(qualifier:Parent) 551052 datatype. The ParentProjectIssueCategoryID 551048 attribute has a cardinality of zero or one 551050 meaning that for each instance of the Category 551038 entity there may be one ParentProjectIssueCategoryID 551048 attribute.

The ProjectIssueCategoryName 551054 attribute is a MEDIUM_Name(qualifier:Category) 551058 datatype. The ProjectIssueCategoryName 551054 attribute has a cardinality of zero or one 551056 meaning that for each instance of the Category 551038 entity there may be one ProjectIssueCategoryName 551054 attribute.

The ProjectIssueCategoryDescription 551060 attribute is a MEDIUM_Description(qualifier:Category) 551064 datatype. The ProjectIssueCategoryDescription 551060 attribute has a cardinality of zero or one 551062 meaning that for each instance of the Category 551038 entity there may be one ProjectIssueCategoryDescription 551060 attribute.

The Log 551066 package is a Log 551072 datatype. The Log 551066 package includes a Log 551068 entity.

The Log 551068 entity has a cardinality of one 551070 meaning that for each instance of the ProjectIssueCategoryCatalogueCategoryByIDResponseMessage_sync 551002 entity there is one Log 551068 entity.

ProjectIssueCategoryCatalogue Package

The ProjectIssueCategoryCatalogue package groups the ProjectIssueCategoryCatalogue information ProjectIssueCategoryCatalogue A ProjectIssueCategoryCatalogue is a hierarchically structured catalogue of categories, which classify project-related issues for a particular project aspect. A ProjectIssueCategoryCatalogueID is an identifier for a catalog of categories for project-related issues. A ProjectIssueCategoryCatalogueProjectIssueCategoryTypeCode is the coded representation of the type of a catalogue for project-related issues. ProjectIssueCategoryCatalogueTypeName (optional) is the language dependent name of the project issue category catalogue type code. ProjectIssueCategoryCatalogueName (optional) is the language dependent name of the project issue category catalogue.

Category Package

A Category package groups together all categories involved in a specific ProjectIssueCategoryCatalogue.

Category

A category is a characteristic of a specific issue that categorizes business events according to an objective or a subjective point of view. A ProjectIssueCategoryID is an identifier for a catalog of categories for project-related issues. A ParentProjectIssueCategoryID (optional) is a project-related issue category that is directly super ordinate to a particular category. A ProjectIssueCategoryName (optional) is the language dependent name of the project issue category catalogue. A ProjectIssueCategoryCatalogueCategoryDescription (optional) is a natural-language representation of the properties of the project issue category catalogue category.

Log Package

A Log package groups the error messages used for user interaction

Log

A Log is a sequence of messages that result when an application executes a task.

QualityIssueCategoryCatalogue Interfaces

Quality inspections for goods receipts or goods issues are examples of business events in which quality-related issues may have to be addressed. E.g. a quality inspector receives a container of computer monitors. Inside the container the screen of one monitor is damaged. For quality issue notification reasons he looks up in the quality issue category catalogue for the specific category 'Damaged monitor display' in the context of the parent category 'Defect' and catalogue 'Material Inspection'.

Message Choreography

The message choreography of FIG. 554 describes a possible logical sequence of messages that can be used to realize a quality issue category catalogue business scenario.

A QualityIssueCategoryCatalogueSimpleByProfileQualityNotificationTypeCodeQuery_sync is an inquiry to InspectionMasterDataProcessing for a QualityIssueCategoryCatalogueSimple. The structure of the message type QualityIssueCategoryCatalogueSimpleByProfileQualityNotificationTypeCodeQuery_sync is specified by the message data type QualityIssueCategoryCatalogueSimpleByProfileQualityNotificationTypeCodeQueryMessage_sync.

A QualityIssueCategoryCatalogueSimpleByProfileQualityNotificationTypeCodeResponse_sync is the response to QualityIssueCategoryCatalogueSimpleByProfileQualityNotificationTypeCodeQuery_sync. The structure of the message type QualityIssueCategoryCatalogueSimpleByProfileQualityNotificationTypeCodeResponse_sync is specified by the message data type QualityIssueCategoryCatalogueSimpleByProfileQualityNotificationTypeCodeResponseMessage_sync.

A QualityIssueCategoryCatalogueCategoryByIDQuery_sync is the inquiry to InspectionMasterDataProcessing for a QualityIssueCategoryCatalogueCategory. The structure of the message type QualityIssueCategoryCatalogueCategoryByIDQuery_sync is specified by the message data type QualityIssueCategoryCatalogueCategoryByIDQueryMessage_sync.

A QualityIssueCategoryCatalogueCategoryByIDResponse_sync is the response to QualityIssueCategoryCatalogueCategoryByIDQuery_sync. The structure of the message type QualityIssueCategoryCatalogueCategoryByIDResponse_sync is specified by the message data type QualityIssueCategoryCatalogueCategoryByIDResponseMessage_sync.

For example, a "Quality Inspector, Employee" system 554002 can query a quality issue category catalogue by profile quality notification type code using the QualityIssueCategoryCatalogueSimpleByProfileQualityNotificationTypeCodeQuery_sync message 554006 as shown, for example, in FIG. 557. An "Inspection Master Data Processing" system 554004 can respond to the query using the QualityIssueCategoryCatalogueSimpleByProfileQualityNotificationTypeCodeResponse_sync message 554008 as shown, for example, in FIG. 558. The "Quality Inspector, Employee" system 554002 can query a quality issue category catalogue by ID using the QualityIssueCategoryCatalogueCategoryByIDQuery_sync message 5540010 as shown, for example, in FIG. 555. The "Inspection Master Data Processing" system 554004 can respond to the query using the QualityIssueCategoryCatalogueCategoryByIDResponse_sync message 554012 as shown, for example, in FIG. 556.

Message Data Type

The message data type QualityIssueCategoryCatalogueSimpleByProfileQualityIssueNotificationTypeCodeQueryMessage_sync contains the Selection included in the business document QualityIssueCategoryCatalogue.

Selection Package

The Selection package collects the selection criteria for QualityIssueCategoryCatalogueID and the corresponding QualityIssueCategoryTypeCode.

QualityIssueCategoryCatalogueSimpleSelectionByProfileQualityIssueNotificationTypeCode QualityIssueCategoryCatalogueSimpleSelectionByProfileQualityIssueNotificationTypeCode specifies selection criteria to select QualityIssueCategoryCatalogues and their corresponding QualityIssueCategoryCatalogueQualityIssueCategoryTypeCodes by QualityIssueCategoryCatalogueProfileQualityIssueNotificationTypeCode. ProfileQualityIssueNotificationTypeCode is the encoded representation of the type of QualityIssueNotifications. A LanguageCode, which can be optional, is the encoded representation of the default language of the catalogue related name(s) and description(s). If no language code is given the system language will be used as default. FIG. 561 shows a QualityIssueCategoryCatalogueSimpleByProfileQualityIssueNotificationTypeCodeQueryMessage_sync 561000 package. The QualityIssueCategoryCatalogueSimpleByProfileQualityIssueNotificationTypeCodeQueryMessage_sync 561000 package is a QualityIssueCategoryCatalogueSimpleByProfileQualityIssueNotificationTypeCodeQueryMessage_sync 561004 datatype. The QualityIssueCategoryCatalogueSimpleByProfileQualityIssueNotificationTypeCodeQueryMessage_sync 561000 package includes a QualityIssueCategoryCatalogueSimpleByProfileQualityIssueNotificationTypeCodeQueryMessage_sync 561002 entity. The QualityIssueCategoryCatalogueSimpleByProfileQualityIssueNotificationTypeCodeQueryMessage_sync 561000 package includes a Selection 561006 package.

The Selection 561006 package is a QualityIssueCategoryCatalogueSimpleSelectionByProfileQualityIssueNotificationTypeCode 561012 datatype. The Selection 561006 package includes a QualityIssueCategoryCatalogueSimpleSelectionByProfileQualityIssueNotificationTypeCode 561008 entity.

The QualityIssueCategoryCatalogueSimpleSelectionByProfileQualityIssueNotificationTypeCode 561008 entity has a cardinality of one 561010 meaning that for each instance of the QualityIssueCategoryCatalogueSimpleByProfileQualityIssueNotificationTypeCodeQueryMessage_sync 561002 entity there is one QualityIssueCategoryCatalogueSimpleSelectionByProfileQualityIssueNotificationTypeCode 561008 entity. The QualityIssueCategoryCatalogueSimpleSelectionByProfileQualityIssueNotificationTypeCode 561008 entity includes various attributes, namely ProfileQualityIssueNotificationTypeCode 561014 and LanguageCode 561020.

The ProfileQualityIssueNotificationTypeCode 561014 attribute is a QualityIssueNotificationTypeCode 561018 datatype. The ProfileQualityIssueNotificationTypeCode 561014 attribute has a cardinality of one 561016 meaning that for each instance of the QualityIssueCategoryCatalogueSimpleSelectionByProfileQualityIssueNotificationTypeCode 561008 entity there is one ProfileQualityIssueNotificationTypeCode 561014 attribute.

The LanguageCode 561020 attribute is a LanguageCode 561024 datatype. The LanguageCode 561020 attribute has a cardinality of zero or one 561022 meaning that for each instance of the QualityIssueCategoryCatalogueSimpleSelectionByProfileQualityIssueNotificationTypeCode 561008 entity there may be one LanguageCode 561020 attribute.

Message Data Type

The message data type QualityIssueCategoryCatalogueSimpleByProfileQualityIssueNotificationTypeCodeResponseMessage_sync contains the QualityIssueCategoryCatalogue included in the business document and the Log. FIG. 562 shows a QualityIssueCategoryCatalogueSimpleByProfileQualityIssueNotificationTypeCodeResponseMessage_sync 562000 package. The QualityIssueCategoryCatalogueSimpleByProfileQualityIssueNotificationTypeCodeResponseMessage_sync 562000 package is a QualityIssueCategoryCatalogueSimpleByProfileQualityIssueNotificationTypeCodeResponseMessage_sync 562004 datatype. The QualityIssueCategoryCatalogueSimpleByProfileQualityIssueNotificationTypeCodeResponseMessage__sync 562000 package includes a QualityIssueCategoryCatalogueSimpleByProfileQualityIssueNotificationTypeCodeResponseMessage_sync 562002 entity. The QualityIssueCategoryCatalogueSimpleByProfileQualityIssueNotificationTypeCodeResponseMessage_sync 562000 package includes various packages, namely QualityIssueCategoryCatalogue 562006 and Log 562036.

The QualityIssueCategoryCatalogue 562006 package includes a QualityIssueCategoryCatalogue 562008 entity.

The QualityIssueCategoryCatalogue 562008 entity has a cardinality of zero or n 562010 meaning that for each instance of the QualityIssueCategoryCatalogueSimpleByProfileQualityIssueNotificationTypeCodeResponseMessage_sync 562002 entity there may be one or more QualityIssueCategoryCatalogue 562008 entities. The QualityIssueCategoryCatalogue 562008 entity includes various attributes, namely ID 562012, QualityIssueCategoryTypeCode 562018, QualityIssueCategoryTypeName 562024 and Name 562030.

The ID 562012 attribute is a QualityIssueCategoryCatalogueID 562016 datatype. The ID 562012 attribute has a cardinality of one 562014 meaning that for each instance of the QualityIssueCategoryCatalogue 562008 entity there is one ID 562012 attribute.

The QualityIssueCategoryTypeCode 562018 attribute is a QualityIssueCategoryCatalogueTypeCode 562022 datatype. The QualityIssueCategoryTypeCode 562018 attribute has a cardinality of one 562020 meaning that for each instance of the QualityIssueCategoryCatalogue 562008 entity there is one QualityIssueCategoryTypeCode 562018 attribute.

The QualityIssueCategoryTypeName 562024 attribute is a MEDIUM_Name(qualifier:CategoryType) 562028 datatype. The QualityIssueCategoryTypeName 562024 attribute has a cardinality of zero or one 562026 meaning that for each instance of the QualityIssueCategoryCatalogue 562008 entity there may be one QualityIssueCategoryTypeName 562024 attribute.

The Name 562030 attribute is a MEDIUM_Name(qualifier:Catalogue) 562034 datatype. The Name 562030 attribute has a cardinality of zero or one 562032 meaning that for each instance of the QualityIssueCategoryCatalogue 562008 entity there may be one Name 562030 attribute.

The Log 562036 package is a Log 562042 datatype. The Log 562036 package includes a Log 562038 entity.

The Log 562038 entity has a cardinality of one 562040 meaning that for each instance of the QualityIssueCategoryCatalogueSimpleByProfileQualityIssueNotificationTypeCodeResponseMessage_sync 562002 entity there is one Log 562038 entity.

QualityIssueCategoryCatalogue Package

The QualityIssueCategoryCatalogue package groups the quality issue category catalogue information.

QualityIssueCategoryCatalogue

A QualityIssueCategoryCatalogue is a hierarchically structured catalogue of categories, which classify quality-related issues for a particular quality aspect. A QualityIssueCategoryCatalogueID is an identifier for a catalog of categories for quality-related issues. A QualityIssueCategoryCatalogueQualityIssueCategoryTypeCode is the coded representation of the type of a category of a catalogue for quality-related issues. In some implementations, all categories of a catalogue can have the same category type code. QualityIssueCategoryCatalogueTypeName, which can be optional, is the language dependent name of the quality issue category catalogue type code. QualityIssueCategoryCatalogueName, which can be optional, is the language dependent name of the quality issue category catalogue.

Log Package

A Log package groups the error messages used for user interaction

Log

A Log is a sequence of messages that result when an application executes a task.

Message Data Type

The message data type QualityIssueCategoryCatalogueCategoryByIDQueryMessage_sync contains the Selection for the business document QualityIssueCategoryCatalogue. FIGS. 559-1 through 559-2 show a QualityIssueCategoryCatalogueCategoryByIDQueryMessage_sync 559000 package. The QualityIssueCategoryCatalogueCategoryByIDQueryMessage_sync 559000 package is a QualityIssueCategoryCatalogueCategoryByIDQueryMessage_sync 559004 datatype. The QualityIssueCategoryCatalogueCategoryByIDQueryMessage_sync 559000 package includes a QualityIssueCategoryCatalogueCategoryByIDQueryMessage_sync 559002 entity. The QualityIssueCategoryCatalogueCategoryByIDQueryMessage_sync 559000 package includes a Selection 559006 package.

The Selection 559006 package is a QualityIssueCategoryCatalogueSelectionByID 559012 datatype. The Selection 559006 package includes a QualityIssueCategoryCatalogueCategorySelectionByID 559008 entity.

The QualityIssueCategoryCatalogueCategorySelectionByID 559008 entity has a cardinality of one 559010 meaning that for each instance of the QualityIssueCategoryCatalogueCategoryByIDQueryMessage_sync 559002 entity there is one QualityIssueCategoryCatalogueCategorySelectionByID 559008 entity. The QualityIssueCategoryCatalogueCategorySelectionByID 559008 entity includes various attributes, namely ID 559014, CategoryParentQualityIssueCategoryID 559020, ProfileIssueCategoryFilterCode 559026 and LanguageCode 559032.

The ID 559014 attribute is a QualityIssueCategoryCatalogueID 559018 datatype. The ID 559014 attribute has a cardinality of one 559016 meaning that for each instance of the QualityIssueCategoryCatalogueCategorySelectionByID 559008 entity there is one ID 559014 attribute.

The CategoryParentQualityIssueCategoryID 559020 attribute is a QualityIssueCategoryID(qualifier:Parent) 559024 datatype. The CategoryParentQualityIssueCategoryID 559020 attribute has a cardinality of zero or one 559022 meaning that for each instance of the QualityIssueCategoryCatalogueCategorySelectionByID 559008 entity there may be one CategoryParentQualityIssueCategoryID 559020 attribute. The ProfileIssueCategoryFilterCode 559026 attribute is an IssueCategoryFilterCode 559030 datatype. The ProfileIssueCategoryFilterCode 559026 attribute has a cardinality of zero or one 559028 meaning that for each instance of the QualityIssueCategoryCatalogueCategorySelectionByID 559008 entity there may be one ProfileIssueCategoryFilterCode 559026 attribute.

The LanguageCode 559032 attribute is a LanguageCode 559036 datatype. The LanguageCode 559032 attribute has a cardinality of zero or one 559034 meaning that for each instance of the QualityIssueCategoryCatalogueCategorySelectionByID 559008 entity there may be one LanguageCode 559032 attribute.

Selection Package

The Selection package collects the selection criteria for QualityIssueCategoryCatalogueCategory.

QualityIssueCategoryCatalogueCategorySelectionByID

QualityIssueCategoryCatalogueCategorySelectionByID specifies selection criteria to select a QualityIssueCategoryCatalogueCategory by QualityIssueCategoryCatalogueID. A QualityIssueCategoryCatalogueID is an identifier for a catalog of categories for quality-related issues. A ParentQualityIssueCategoryID, which can be optional, is a quality-related issue category that is directly super ordinate to a particular category. A QualityIssueCategoryCatalogueProfileIssueCategoryFilterCode, which can be optional, is the coded representation of issue category filter codes for quality issue-related categories. A LanguageCode, which can be optional, is the encoded representation of the default language of the catalogue related name(s) and description(s). If no language code is given the system language will be used as default. CategoryParentQualityIssueCategoryID can be used by MaterialInspection. QualityIssueCategoryCatalogueIssueCategoryFilterCode can be used by QualityIssueNotification.

Message Data Type

The message data type QualityIssueCategoryCatalogueCategoryByIDResponseMessage_sync contains the QualityIssueCategoryCatalogue included in the business document and the Log. FIGS. 560-1 through 560-2 show a QualityIssueCategoryCatalogueCategoryByIDResponseMessage_sync 560000 package. The QualityIssueCategoryCatalogueCategoryByIDResponseMessage_sync 560000 package is a QualityIssueCategoryCatalogueMessage_sync 560004 datatype. The QualityIssueCategoryCatalogueCategoryByIDResponseMessage_sync 560000 package includes a QualityIssueCategoryCatalogueCategoryByIDResponseMessage_sync 560002 entity. The QualityIssueCategoryCatalogueCategoryByIDResponseMessage_sync 560000 package includes various packages, namely QualityIssueCategoryCatalogue 560006 and Log 560066.

The QualityIssueCategoryCatalogue 560006 package includes a QualityIssueCategoryCatalogue 560008 entity. The QualityIssueCategoryCatalogue 560006 package includes a Category 560036 package.

The QualityIssueCategoryCatalogue 560008 entity has a cardinality of zero or one 560010 meaning that for each instance of the QualityIssueCategoryCatalogueCategoryByIDResponseMessage_sync 560002 entity there may be one QualityIssueCategoryCatalogue 560008 entity. The QualityIssueCategoryCatalogue 560008 entity includes various attributes, namely ID 560012, QualityIssueCategoryTypeCode 560018, Name 560024 and QualityIssueCategoryTypeName 560030.

The ID 560012 attribute is a QualityIssueCategoryCatalogueID 560016 datatype. The ID 560012 attribute has a cardinality of one 560014 meaning that for each instance of the QualityIssueCategoryCatalogue 560008 entity there is one ID 560012 attribute.

The QualityIssueCategoryTypeCode 560018 attribute is a QualityIssueCategoryTypeCode 560022 datatype. The QualityIssueCategoryTypeCode 560018 attribute has a cardinality of one 560020 meaning that for each instance of the QualityIssueCategoryCatalogue 560008 entity there is one QualityIssueCategoryTypeCode 560018 attribute.

The Name 560024 attribute is a MEDIUM_Name(Qualifier:Catalogue) 560028 datatype. The Name 560024 attribute has a cardinality of zero or one 560026 meaning that for each instance of the QualityIssueCategoryCatalogue 560008 entity there may be one Name 560024 attribute.

The QualityIssueCategoryTypeName 560030 attribute is a MEDIUM_Name(Qualifier:CategoryType) 560034 datatype. The QualityIssueCategoryTypeName 560030 attribute has a cardinality of zero or one 560032 meaning that for each instance of the QualityIssueCategoryCatalogue 560008 entity there may be one QualityIssueCategoryTypeName 560030 attribute.

The Category 560036 package includes a Category 560038 entity.

The Category 560038 entity has a cardinality of zero or n 560040 meaning that for each instance of the QualityIssueCategoryCatalogue 560008 entity there may be one or more Category 560038 entities. The Category 560038 entity includes various attributes, namely QualityIssueCategoryID 560042, ParentQualityIssueCategoryID 560048, QualityIssueCategoryName 560054 and QualityIssueCategoryDescription 560060.

The QualityIssueCategoryID 560042 attribute is a QualityIssueCategoryID 560046 datatype. The QualityIssueCategoryID 560042 attribute has a cardinality of one 560044 meaning that for each instance of the Category 560038 entity there is one QualityIssueCategoryID 560042 attribute.

The ParentQualityIssueCategoryID 560048 attribute is a QualityIssueCategoryID(qualifier:Parent) 560052 datatype. The ParentQualityIssueCategoryID 560048 attribute has a cardinality of zero or one 560050 meaning that for each instance of the Category 560038 entity there may be one ParentQualityIssueCategoryID 560048 attribute.

The QualityIssueCategoryName 560054 attribute is a MEDIUM_Name(qualifier:Category) 560058 datatype. The QualityIssueCategoryName 560054 attribute has a cardinality of zero or one 560056 meaning that for each instance of the Category 560038 entity there may be one QualityIssueCategoryName 560054 attribute.

The QualityIssueCategoryDescription 560060 attribute is a MEDIUM_Description(qualifier:Category) 560064 datatype. The QualityIssueCategoryDescription 560060 attribute has a cardinality of zero or one 560062 meaning that for each instance of the Category 560038 entity there may be one QualityIssueCategoryDescription 560060 attribute.

The Log 560066 package is a Log 560072 datatype. The Log 560066 package includes a Log 560068 entity.

The Log 560068 entity has a cardinality of one 560070 meaning that for each instance of the QualityIssueCategoryCatalogueCategoryByIDResponseMessage_sync 560002 entity there is one Log 560068 entity.

QualityIssueCategoryCatalogue Package

The QualityIssueCategoryCatalogue package groups the QualityIssueCategoryCatalogue information QualityIssueCategoryCatalogue A QualityIssueCategoryCatalogue is a hierarchically structured catalogue of categories, which classify quality-related issues for a particular quality aspect. A QualityIssueCategoryCatalogueID is an identifier for a catalog of categories for quality-related issues. A QualityIssueCategoryCatalogueQualityIssueCategoryTypeCode is the coded representation of the type of a catalogue for quality-related issues. QualityIssueCategoryCatalogueTypeName, which can be optional, is the language dependent name of the quality issue category catalogue type code. QualityIssueCategoryCatalogueName, which can be optional, is the language dependent name of the quality issue category catalogue.

Category Package

A Category package groups together all categories involved in a specific QualityIssueCategoryCatalogue.

Category

A category is a characteristic of a specific issue that categorizes business events according to an objective or a subjective point of view. A QualityIssueCategoryID is an identifier for a catalog of categories for quality-related issues. A ParentQualityIssueCategoryID, which can be optional, is a quality-related issue category that is directly super ordinate to a particular category. A QualityIssueCategoryName, which can be optional, is the language dependent name of the quality issue category catalogue. A QualityIssueCategoryCatalogueCategoryDescription, which can be optional, is a natural-language representation of the properties of the quality issue category catalogue category.

Log Package

A Log package groups the error messages used for user interaction

Log

A Log is a sequence of messages that result when an application executes a task.

QualityIssueNotification Interfaces

In the event of problems or defects found resulting from poor-quality goods, a quality inspector needs to inform the concerned persons to analyze the recorded defects and monitor the correction of these problems. QualityIssueNotifications are used to provide detailed information about the defect and the corrective actions which were carried out in the process. In particular, the QualityIssueNotifications can help to process internal or external problems such as quality-related complaints filed by customers, quality-related complaints against vendors, or company-internal quality-related problems.

Message Choreography

The message choreography of FIG. 563 describes a possible logical sequence of messages that can be used to realize a quality issue notification business scenario.

A QualityIssueNotificationCreateRequest_sync is a request to the Quality Management to create a QualityIssueNotification. The structure of the message type QualityIssueNotificationCreateRequest_sync is specified by the message data type QualityIssueNotificationCreateRequestMessage_sync.

A QualityIssueNotificationCreateConfirmation_sync is a confirmation sent from Quality Management concerning the request to create a QualityIssueNotification. The structure of the message type QualityIssueNotificationCreateConfirmation_sync is specified by the message data type QualityIssueNotificationCreateConfirmationMessage_sync.

A QualityIssueNotificationByIDQuery_sync is an inquiry to Quality Management to return QualityIssueNotifications for the QualityIssueNotificationID. The structure of the message type QualityIssueNotificationByIDQuery_sync is specified by the message data type QualityIssueNotificationByIDQueryMessage_sync.

A QualityIssueNotificationByIDResponse_sync is the response from Quality Management to the inquiry QualityIssueNotificationByIDQuery_sync. The structure of the message type QualityIssueNotificationByIDResponse_sync is specified by the message data type QualityIssueNotificationByIDResponseMessage_sync.

A QualityIssueNotificationChangeRequest_sync is a request to the Quality Management to change a QualityIssueNotification. The structure of the message type QualityIssueNotificationChangeRequest_sync is specified by the message data type QualityIssueNotificationChangeRequestMessage_sync.

A QualityIssueNotificationChangeConfirmation_sync is a confirmation sent from Quality Management to request to change a QualityIssueNotification. The structure of the message type QualityIssueNotificationChangeConfirmation_sync is specified by the message data type QualityIssueNotificationChangeConfirmationMessage_sync.

A QualityIssueNotificationProductByElementsQuery_sync is an inquiry to Quality Management to return QualityIssueNotifications based on certain selection parameters. The structure of the message type QualityIssueNotificationProductByElementsQuery_sync is specified by the message data type QualityIssueNotificationProductByElementsQueryMessage_sync.

A QualityIssueNotificationProductByElementsResponse_sync is the response from Quality Management to the inquiry QualityIssueNotificationProductByElementsQuery_sync. The structure of the message type QualityIssueNotificationProductByElementsResponse_sync is specified by the message data type QualityIssueNotificationProductByElementsResponseMessage_sync.

For example, a "Quality Inspector" system 563002 can request to create a quality issue notification using the QualityIssueNotificationCreateRequest_sync message 563006 as shown, for example, in FIGS. 569-1 through 569-4. A "Quality Management" system 563004 can confirm the creation request using the QualityIssueNotificationCreateConfirmation_sync message 563008 as shown, for example, in FIG. 568. The "Quality Inspector" system 563002 can query quality issue notifications by ID using the QualityIssueNotificationByIDQuery_sync message 563010 as shown, for example, in FIG. 564. The "Quality Management" system 563004 can respond to the query using the QualityIssueNotificationByIDResponse_sync message 563012 as shown, for example, in FIGS. 565-1 through 565-4. The "Quality Inspector" system 563002 can request to change a quality issue notification using the QualityIssueNotificationChangeRequest_sync message 563014 as shown, for example, in FIGS. 567-1 through 567-4. The "Quality Management" system 563004 can confirm the change request using the QualityIssueNotificationChangeConfirmation_sync message 563016 as shown, for example, in FIG. 566. The "Quality Inspector" system 563002 can query quality issue notification products by element using the QualityIssueNotificationProductByElementsQuery_sync message 563018 as shown, for example, in FIG. 570. The "Quality Management" system 563004 can respond to the query using the QualityIssueNotificationProductByElementsResponse_sync message 563020 as shown, for example, in FIGS. 571-1 through 571-2.

Message Data Type

The message data type QualityIssueNotificationCreateRequestMessage_sync contains the business information that is relevant for sending a business document in a message and the QualityIssueNotification included in the business document. FIGS. 577-1 through 577-24 show a QualityIssueNotificationCreateRequestMessage_sync 577000 package. The QualityIssueNotificationCreateRequestMessage_sync 577000 package is a QualityIssueNotificationCreateRequestMessage_sync 577004 datatype. The QualityIssueNotificationCreateRequestMessage_sync 577000 package includes a QualityIssueNotificationCreateRequestMessage_sync 577002 entity. The QualityIssueNotificationCreateRequestMessage_sync 577000 package includes various packages, namely MessageHeader 577006 and QualityIssueNotification 577014.

The MessageHeader 577006 package is a BasicBusinessDocumentMessageHeader 577012 datatype. The MessageHeader 577006 package includes a MessageHeader 577008 entity.

The MessageHeader 577008 entity has a cardinality of zero or one 577010 meaning that for each instance of the QualityIssueNotificationCreateRequestMessage_sync 577002 entity there may be one MessageHeader 577008 entity.

The QualityIssueNotification 577014 package includes a QualityIssueNotification 577016 entity. The QualityIssueNotification 577014 package includes various packages, namely Item 5770140, Task 5770404, Activity 5770476, Party 5770524, ProductInformation 5770584, SalesOrderInformation 5770644 and BusinessTransactionDocumentReference 5770680.

The QualityIssueNotification 577016 entity has a cardinality of one 577018 meaning that for each instance of the QualityIssueNotificationCreateRequestMessage_sync 577002 entity there is one QualityIssueNotification 577016 entity. The QualityIssueNotification 577016 entity includes various attributes, namely ID 577020, ExternalQualityIssueNotificationReference 577026, IssueQualityIssueCategoryCatalogueID 577032, IssueParentQualityIssueCategoryID 577038, IssueQualityIssueCategoryID 577044, ReporterInternalID 577050, ReportedDateTime 577056, RequestedProcessingPeriod 577062, MachineryBreakdownIndicator 577068, MachineryMalfunctionPeriod 577074, TypeCode 577080, ImportanceCode 577086, ComplaintQuantity 577092, ReferenceQuantity 577098, InternalNonconformingQuantity 5770104, ExternalNonconformingQuantity 5770110, ReturnedQuantity 5770116, ReturnedDate 5770122, Description 5770128 and DetailedText 5770134.

The ID 577020 attribute is a QualityIssueNotificationID 577024 datatype. The ID 577020 attribute has a cardinality of zero or one 577022 meaning that for each instance of the QualityIssueNotification 577016 entity there may be one ID 577020 attribute.

The ExternalQualityIssueNotificationReference 577026 attribute is a BusinessTransactionDocumentReference 577030 datatype. The ExternalQualityIssueNotificationReference 577026 attribute has a cardinality of zero or one 577028 meaning that for each instance of the QualityIssueNotification 577016 entity there may be one ExternalQualityIssueNotificationReference 577026 attribute.

The IssueQualityIssueCategoryCatalogueID 577032 attribute is a QualityIssueCategoryCatalogueID 577036 datatype. The IssueQualityIssueCategoryCatalogueID 577032 attribute has a cardinality of zero or one 577034 meaning that for each instance of the QualityIssueNotification 577016 entity there may be one IssueQualityIssueCategoryCatalogueID 577032 attribute.

The IssueParentQualityIssueCategoryID 577038 attribute is a QualityIssueCategoryID 577042 datatype. The IssueParentQualityIssueCategoryID 577038 attribute has a cardinality of zero or one 577040 meaning that for each instance of the QualityIssueNotification 577016 entity there may be one IssueParentQualityIssueCategoryID 577038 attribute.

The IssueQualityIssueCategoryID 577044 attribute is a QualityIssueCategoryID 577048 datatype. The IssueQualityIssueCategoryID 577044 attribute has a cardinality of zero or one 577046 meaning that for each instance of the QualityIssueNotification 577016 entity there may be one IssueQualityIssueCategoryID 577044 attribute.

The ReporterInternalID 577050 attribute is a PartyInternalID 577054 datatype. The ReporterInternalID 577050 attribute has a cardinality of zero or one 577052 meaning that for each instance of the QualityIssueNotification 577016 entity there may be one ReporterInternalID 577050 attribute.

The ReportedDateTime 577056 attribute is a TIMEZONEINDEPENDENT_DateTime 577060 datatype. The ReportedDateTime 577056 attribute has a cardinality of zero or one 577058 meaning that for each instance of the QualityIssueNotification 577016 entity there may be one ReportedDateTime 577056 attribute.

The RequestedProcessingPeriod 577062 attribute is an UPPEROPEN_TIMEZONEINDEPENDENT_ DateTimePeriod 577066 datatype. The RequestedProcessingPeriod 577062 attribute has a cardinality of zero or one 577064 meaning that for each instance of the QualityIssueNotification 577016 entity there may be one RequestedProcessingPeriod 577062 attribute.

The MachineryBreakdownIndicator 577068 attribute is an Indicator 577072 datatype. The MachineryBreakdownIndicator 577068 attribute has a cardinality of zero or one 577070 meaning that for each instance of the QualityIssueNotification 577016 entity there may be one MachineryBreakdownIndicator 577068 attribute.

The MachineryMalfunctionPeriod 577074 attribute is an UPPEROPEN_TIMEZONEINDEPENDENT_ DateTimePeriod 577078 datatype. The MachineryMalfunctionPeriod 577074 attribute has a cardinality of zero or one 577076 meaning that for each instance of the QualityIssueNotification 577016 entity there may be one MachineryMalfunctionPeriod 577074 attribute.

The TypeCode 577080 attribute is a QualityIssueNotificationTypeCode 577084 datatype. The TypeCode 577080 attribute has a cardinality of one 577082 meaning that for each instance of the QualityIssueNotification 577016 entity there is one TypeCode 577080 attribute.

The ImportanceCode 577086 attribute is an ImportanceCode 577090 datatype. The ImportanceCode 577086 attribute has a cardinality of zero or one 577088 meaning that for each instance of the QualityIssueNotification 577016 entity there may be one ImportanceCode 577086 attribute.

The ComplaintQuantity 577092 attribute is a Quantity 577096 datatype. The ComplaintQuantity 577092 attribute has a cardinality of zero or one 577094 meaning that for each instance of the QualityIssueNotification 577016 entity there may be one ComplaintQuantity 577092 attribute.

The ReferenceQuantity 577098 attribute is a Quantity 5770102 datatype. The ReferenceQuantity 577098 attribute has a cardinality of zero or one 5770100 meaning that for each instance of the QualityIssueNotification 577016 entity there may be one ReferenceQuantity 577098 attribute.

The InternalNonconformingQuantity 5770104 attribute is a Quantity 5770108 datatype. The InternalNonconformingQuantity 5770104 attribute has a cardinality of zero or one 5770106 meaning that for each instance of the QualityIssueNotification 577016 entity there may be one InternalNonconformingQuantity 5770104 attribute.

The ExternalNonconformingQuantity 5770110 attribute is a Quantity 5770114 datatype. The ExternalNonconformingQuantity 5770110 attribute has a cardinality of zero or one 5770112 meaning that for each instance of the QualityIssueNotification 577016 entity there may be one ExternalNonconformingQuantity 5770110 attribute.

The ReturnedQuantity 5770116 attribute is a Quantity 5770120 datatype. The ReturnedQuantity 5770116 attribute has a cardinality of zero or one 5770118 meaning that for each instance of the QualityIssueNotification 577016 entity there may be one ReturnedQuantity 5770116 attribute.

The ReturnedDate 5770122 attribute is a Date 5770126 datatype. The ReturnedDate 5770122 attribute has a cardinality of zero or one 5770124 meaning that for each instance of the QualityIssueNotification 577016 entity there may be one ReturnedDate 5770122 attribute.

The Description 5770128 attribute is a SHORT_Description 5770132 datatype. The Description 5770128 attribute has a cardinality of zero or one 5770130 meaning that for each instance of the QualityIssueNotification 577016 entity there may be one Description 5770128 attribute.

The DetailedText 5770134 attribute is a Text 5770138 datatype. The DetailedText 5770134 attribute has a cardinality of zero or one 5770136 meaning that for each instance of the QualityIssueNotification 577016 entity there may be one DetailedText 5770134 attribute.

The Item 5770140 package includes an Item 5770142 entity. The Item 5770140 package includes various packages, namely Cause 5770242, Task 5770284 and Activity 5770356.

The Item 5770142 entity has a cardinality of zero or n 5770144 meaning that for each instance of the QualityIssueNotification 577016 entity there may be one or more Item 5770142 entities. The Item 5770142 entity includes various attributes, namely MaterialInternalID 5770146, MaterialInspectionSampleID 5770152, DefectTypeQualityIssueCategoryCatalogueID 5770158, DefectTypeParentQualityIssueCategoryID 5770164, DefectTypeQualityIssueCategoryID 5770170, DefectLocationQualityIssueCategoryCatalogueID 5770176, DefectLocationParentQualityIssueCategoryID 5770182, DefectLocationQualityIssueCategoryID 5770188, DefectNumberValue 5770194, DefectClassCode 5770200, DefectWeightingClassCode 5770206, InternalNonconformingQuantity 5770212, ExternalNonconformingQuantity 5770218, Description 5770224, DetailedText 5770230 and OrdinalNumberValue 5770236.

The MaterialInternalID 5770146 attribute is a ProductInternalID 5770150 datatype. The MaterialInternalID 5770146 attribute has a cardinality of zero or one 5770148 meaning that for each instance of the Item 5770142 entity there may be one MaterialInternalID 5770146 attribute.

The MaterialInspectionSampleID 5770152 attribute is a MaterialInspectionSampleID 5770156 datatype. The MaterialInspectionSampleID 5770152 attribute has a cardinality of zero or one 5770154 meaning that for each instance of the Item 5770142 entity there may be one MaterialInspectionSampleID 5770152 attribute.

The DefectTypeQualityIssueCategoryCatalogueID 5770158 attribute is a QualityIssueCategoryCatalogueID 5770162 datatype. The DefectTypeQualityIssueCategoryCatalogueID 5770158 attribute has a cardinality of zero or one 5770160 meaning that for each instance of the Item 5770142 entity there may be one DefectTypeQualityIssueCategoryCatalogueID 5770158 attribute.

The DefectTypeParentQualityIssueCategoryID 5770164 attribute is a QualityIssueCategoryID 5770168 datatype. The DefectTypeParentQualityIssueCategoryID 5770164 attribute has a cardinality of zero or one 5770166 meaning that for each instance of the Item 5770142 entity there may be one DefectTypeParentQualityIssueCategoryID 5770164 attribute.

The DefectTypeQualityIssueCategoryID 5770170 attribute is a QualityIssueCategoryID 5770174 datatype. The DefectTypeQualityIssueCategoryID 5770170 attribute has a cardinality of zero or one 5770172 meaning that for each instance of the Item 5770142 entity there may be one DefectTypeQualityIssueCategoryID 5770170 attribute.

The DefectLocationQualityIssueCategoryCatalogueID 5770176 attribute is a QualityIssueCategoryCatalogueID 5770180 datatype. The DefectLocationQualityIssueCategoryCatalogueID 5770176 attribute has a cardinality of zero or one 5770178 meaning that for each instance of the Item 5770142 entity there may be one DefectLocationQualityIssueCategoryCatalogueID 5770176 attribute.

The DefectLocationParentQualityIssueCategoryID 5770182 attribute is a QualityIssueCategoryID 5770186 datatype. The DefectLocationParentQualityIssueCategoryID 5770182 attribute has a cardinality of zero or one 5770184 meaning that for each instance of the Item 5770142 entity there may be one DefectLocationParentQualityIssueCategoryID 5770182 attribute.

The DefectLocationQualityIssueCategoryID 5770188 attribute is a QualityIssueCategoryID 5770192 datatype. The DefectLocationQualityIssueCategoryID 5770188 attribute has a cardinality of zero or one 5770190 meaning that for each instance of the Item 5770142 entity there may be one DefectLocationQualityIssueCategoryID 5770188 attribute.

The DefectNumberValue 5770194 attribute is a NumberValue 5770198 datatype. The DefectNumberValue 5770194 attribute has a cardinality of zero or one 5770196 meaning that for each instance of the Item 5770142 entity there may be one DefectNumberValue 5770194 attribute.

The DefectClassCode 5770200 attribute is a DefectClassCode 5770204 datatype. The DefectClassCode 5770200 attribute has a cardinality of zero or one 5770202 meaning that for each instance of the Item 5770142 entity there may be one DefectClassCode 5770200 attribute.

The DefectWeightingClassCode 5770206 attribute is a DefectWeightingClassCode 5770210 datatype. The DefectWeightingClassCode 5770206 attribute has a cardinality of zero or one 5770208 meaning that for each instance of the Item 5770142 entity there may be one DefectWeightingClassCode 5770206 attribute.

The InternalNonconformingQuantity 5770212 attribute is a Quantity 5770216 datatype. The InternalNonconformingQuantity 5770212 attribute has a cardinality of zero or one 5770214 meaning that for each instance of the Item 5770142 entity there may be one InternalNonconformingQuantity 5770212 attribute.

The ExternalNonconformingQuantity 5770218 attribute is a Quantity 5770222 datatype. The ExternalNonconformingQuantity 5770218 attribute has a cardinality of zero or one 5770220 meaning that for each instance of the Item 5770142 entity there may be one ExternalNonconformingQuantity 5770218 attribute.

The Description 5770224 attribute is a SHORT_Description 5770228 datatype. The Description 5770224 attribute has a cardinality of zero or one 5770226 meaning that for each instance of the Item 5770142 entity there may be one Description 5770224 attribute.

The DetailedText 5770230 attribute is a Text 5770234 datatype. The DetailedText 5770230 attribute has a cardinality of zero or one 5770232 meaning that for each instance of the Item 5770142 entity there may be one DetailedText 5770230 attribute.

The OrdinalNumberValue 5770236 attribute is an OrdinalNumberValue 5770240 datatype. The OrdinalNumberValue 5770236 attribute has a cardinality of zero or one 5770238 meaning that for each instance of the Item 5770142 entity there may be one OrdinalNumberValue 5770236 attribute.

The Cause 5770242 package includes a Cause 5770244 entity.

The Cause 5770244 entity has a cardinality of zero or n 5770246 meaning that for each instance of the Item 5770142 entity there may be one or more Cause 5770244 entities. The Cause 5770244 entity includes various attributes, namely QualityIssueCategoryCatalogueID 5770248, ParentQualityIssueCategoryID 5770254, QualityIssueCategoryID 5770260, Description 5770266, DetailedText 5770272 and OrdinalNumberValue 5770278.

The QualityIssueCategoryCatalogueID 5770248 attribute is a QualityIssueCategoryCatalogueID 5770252 datatype. The QualityIssueCategoryCatalogueID 5770248 attribute has a cardinality of zero or one 5770250 meaning that for each instance of the Cause 5770244 entity there may be one QualityIssueCategoryCatalogueID 5770248 attribute.

The ParentQualityIssueCategoryID 5770254 attribute is a QualityIssueCategoryID 5770258 datatype. The ParentQualityIssueCategoryID 5770254 attribute has a cardinality of zero or one 5770256 meaning that for each instance of the Cause 5770244 entity there may be one ParentQualityIssueCategoryID 5770254 attribute.

The QualityIssueCategoryID 5770260 attribute is a QualityIssueCategoryID 5770264 datatype. The QualityIssueCategoryID 5770260 attribute has a cardinality of zero or one 5770262 meaning that for each instance of the Cause 5770244 entity there may be one QualityIssueCategoryID 5770260 attribute.

The Description 5770266 attribute is a SHORT_Description 5770270 datatype. The Description 5770266 attribute has a cardinality of zero or one 5770268 meaning that for each instance of the Cause 5770244 entity there may be one Description 5770266 attribute.

The DetailedText 5770272 attribute is a Text 5770276 datatype. The DetailedText 5770272 attribute has a cardinality of zero or one 5770274 meaning that for each instance of the Cause 5770244 entity there may be one DetailedText 5770272 attribute.

The OrdinalNumberValue 5770278 attribute is an OrdinalNumberValue 5770282 datatype. The OrdinalNumberValue 5770278 attribute has a cardinality of zero or one 5770280 meaning that for each instance of the Cause 5770244 entity there may be one OrdinalNumberValue 5770278 attribute.

The Task 5770284 package includes a Task 5770286 entity.

The Task 5770286 entity has a cardinality of zero or n 5770288 meaning that for each instance of the Item 5770142 entity there may be one or more Task 5770286 entities. The Task 5770286 entity includes various attributes, namely QualityIssueCategoryCatalogueID 5770290, ParentQualityIssueCategoryID 5770296, QualityIssueCategoryID 5770302, PlannedProcessingPeriod 5770308, EmployeeResponsibleInternalID 5770314, EmployeeResponsibleInternalTypeCode 5770320, CompleterInternalID 5770326, CompletionDateTime 5770332, Description 5770338, DetailedText 5770344 and OrdinalNumberValue 5770350.

The QualityIssueCategoryCatalogueID 5770290 attribute is a QualityIssueCategoryCatalogueID 5770294 datatype. The QualityIssueCategoryCatalogueID 5770290 attribute has a cardinality of zero or one 5770292 meaning that for each instance of the Task 5770286 entity there may be one QualityIssueCategoryCatalogueID 5770290 attribute.

The ParentQualityIssueCategoryID 5770296 attribute is a QualityIssueCategoryID 5770300 datatype. The ParentQualityIssueCategoryID 5770296 attribute has a cardinality of zero or one 5770298 meaning that for each instance of the Task 5770286 entity there may be one ParentQualityIssueCategoryID 5770296 attribute.

The QualityIssueCategoryID 5770302 attribute is a QualityIssueCategoryID 5770306 datatype. The QualityIssueCategoryID 5770302 attribute has a cardinality of zero or one 5770304 meaning that for each instance of the Task 5770286 entity there may be one QualityIssueCategoryID 5770302 attribute.

The PlannedProcessingPeriod 5770308 attribute is an UPPEROPEN_TIMEZONEINDEPENDENT_ DateTimePeriod 5770312 datatype. The PlannedProcessingPeriod 5770308 attribute has a cardinality of zero or one 5770310 meaning that for each instance of the Task 5770286 entity there may be one PlannedProcessingPeriod 5770308 attribute.

The EmployeeResponsibleInternalID 5770314 attribute is a PartyInternalID 5770318 datatype. The EmployeeResponsibleInternalID 5770314 attribute has a cardinality of zero or one 5770316 meaning that for each instance of the Task 5770286 entity there may be one EmployeeResponsibleInternalID 5770314 attribute.

The EmployeeResponsibleInternalTypeCode 5770320 attribute is a BusinessObjectTypeCode 5770324 datatype. The EmployeeResponsibleInternalTypeCode 5770320 attribute has a cardinality of zero or one 5770322 meaning that for each instance of the Task 5770286 entity there may be one EmployeeResponsibleInternalTypeCode 5770320 attribute.

The CompleterInternalID 5770326 attribute is a PartyInternalID 5770330 datatype. The CompleterInternalID 5770326 attribute has a cardinality of zero or one 5770328 meaning that for each instance of the Task 5770286 entity there may be one CompleterInternalID 5770326 attribute.

The CompletionDateTime 5770332 attribute is a TIMEZONEINDEPENDENT_DateTime 5770336 datatype. The CompletionDateTime 5770332 attribute has a cardinality of zero or one 5770334 meaning that for each instance of the Task 5770286 entity there may be one CompletionDateTime 5770332 attribute.

The Description 5770338 attribute is a SHORT_Description 5770342 datatype. The Description 5770338 attribute has a cardinality of zero or one 5770340 meaning that for each instance of the Task 5770286 entity there may be one Description 5770338 attribute.

The DetailedText 5770344 attribute is a Text 5770348 datatype. The DetailedText 5770344 attribute has a cardinality of zero or one 5770346 meaning that for each instance of the Task 5770286 entity there may be one DetailedText 5770344 attribute.

The OrdinalNumberValue 5770350 attribute is an OrdinalNumberValue 5770354 datatype. The OrdinalNumberValue 5770350 attribute has a cardinality of zero or one 5770352 meaning that for each instance of the Task 5770286 entity there may be one OrdinalNumberValue 5770350 attribute.

The Activity 5770356 package includes an Activity 5770358 entity.

The Activity 5770358 entity has a cardinality of zero or n 5770360 meaning that for each instance of the Item 5770142 entity there may be one or more Activity 5770358 entities. The Activity 5770358 entity includes various attributes, namely QualityIssueCategoryCatalogueID 5770362, ParentQualityIssueCategoryID 5770368, QualityIssueCategoryID 5770374, ProcessingPeriod 5770380, Description 5770386, DetailedText 5770392 and OrdinalNumberValue 5770398.

The QualityIssueCategoryCatalogueID 5770362 attribute is a QualityIssueCategoryCatalogueID 5770366 datatype. The QualityIssueCategoryCatalogueID 5770362 attribute has a cardinality of zero or one 5770364 meaning that for each instance of the Activity 5770358 entity there may be one QualityIssueCategoryCatalogueID 5770362 attribute.

The ParentQualityIssueCategoryID 5770368 attribute is a QualityIssueCategoryID 5770372 datatype. The ParentQualityIssueCategoryID 5770368 attribute has a cardinality of zero or one 5770370 meaning that for each instance of the Activity 5770358 entity there may be one ParentQualityIssueCategoryID 5770368 attribute.

The QualityIssueCategoryID 5770374 attribute is a QualityIssueCategoryID 5770378 datatype. The QualityIssueCategoryID 5770374 attribute has a cardinality of zero or one 5770376 meaning that for each instance of the Activity 5770358 entity there may be one QualityIssueCategoryID 5770374 attribute.

The ProcessingPeriod 5770380 attribute is an UPPEROPEN_TIMEZONEINDEPENDENT_DateTimePeriod 5770384 datatype. The ProcessingPeriod 5770380 attribute has a cardinality of zero or one 5770382 meaning that for each instance of the Activity 5770358 entity there may be one ProcessingPeriod 5770380 attribute.

The Description 5770386 attribute is a SHORT_Description 5770390 datatype. The Description 5770386 attribute has a cardinality of zero or one 5770388 meaning that for each instance of the Activity 5770358 entity there may be one Description 5770386 attribute.

The DetailedText 5770392 attribute is a Text 5770396 datatype. The DetailedText 5770392 attribute has a cardinality of zero or one 5770394 meaning that for each instance of the Activity 5770358 entity there may be one DetailedText 5770392 attribute.

The OrdinalNumberValue 5770398 attribute is an OrdinalNumberValue 5770402 datatype. The OrdinalNumberValue 5770398 attribute has a cardinality of zero or one 5770400 meaning that for each instance of the Activity 5770358 entity there may be one OrdinalNumberValue 5770398 attribute.

The Task 5770404 package includes a Task 5770406 entity.

The Task 5770406 entity has a cardinality of zero or n 5770408 meaning that for each instance of the QualityIssueNotification 577016 entity there may be one or more Task 5770406 entities. The Task 5770406 entity includes various attributes, namely QualityIssueCategoryCatalogueID 5770410, ParentQualityIssueCategoryID 5770416, QualityIssueCategoryID 5770422, PlannedProcessingPeriod 5770428, EmployeeResponsibleInternalID 5770434, EmployeeResponsibleInternalTypeCode 5770440, CompleterInternalID 5770446, CompletionDateTime 5770452, Description 5770458, DetailedText 5770464 and OrdinalNumberValue 5770470.

The QualityIssueCategoryCatalogueID 5770410 attribute is a QualityIssueCategoryCatalogueID 5770414 datatype. The QualityIssueCategoryCatalogueID 5770410 attribute has a cardinality of zero or one 5770412 meaning that for each instance of the Task 5770406 entity there may be one QualityIssueCategoryCatalogueID 5770410 attribute.

The ParentQualityIssueCategoryID 5770416 attribute is a QualityIssueCategoryID 5770420 datatype. The ParentQualityIssueCategoryID 5770416 attribute has a cardinality of zero or one 5770418 meaning that for each instance of the Task 5770406 entity there may be one ParentQualityIssueCategoryID 5770416 attribute.

The QualityIssueCategoryID 5770422 attribute is a QualityIssueCategoryID 5770426 datatype. The QualityIssueCategoryID 5770422 attribute has a cardinality of zero or one 5770424 meaning that for each instance of the Task 5770406 entity there may be one QualityIssueCategoryID 5770422 attribute.

The PlannedProcessingPeriod 5770428 attribute is an UPPEROPEN_TIMEZONEINDEPENDENT_ DateTimePeriod 5770432 datatype. The PlannedProcessingPeriod 5770428 attribute has a cardinality of zero or one 5770430 meaning that for each instance of the Task 5770406 entity there may be one PlannedProcessingPeriod 5770428 attribute.

The EmployeeResponsibleInternalID 5770434 attribute is a PartyInternalID 5770438 datatype. The EmployeeResponsibleInternalID 5770434 attribute has a cardinality of zero or one 5770436 meaning that for each instance of the Task 5770406 entity there may be one EmployeeResponsibleInternalID 5770434 attribute.

The EmployeeResponsibleInternalTypeCode 5770440 attribute is a BusinessObjectTypeCode 5770444 datatype. The EmployeeResponsibleInternalTypeCode 5770440 attribute has a cardinality of zero or one 5770442 meaning that for each instance of the Task 5770406 entity there may be one EmployeeResponsibleInternalTypeCode 5770440 attribute.

The CompleterInternalID 5770446 attribute is a PartyInternalID 5770450 datatype. The CompleterInternalID 5770446 attribute has a cardinality of zero or one 5770448 meaning that for each instance of the Task 5770406 entity there may be one CompleterInternalID 5770446 attribute.

The CompletionDateTime 5770452 attribute is a TIMEZONEINDEPENDENT_DateTime 5770456 datatype. The CompletionDateTime 5770452 attribute has a cardinality of zero or one 5770454 meaning that for each instance of the Task 5770406 entity there may be one CompletionDateTime 5770452 attribute.

The Description 5770458 attribute is a SHORT_Description 5770462 datatype. The Description 5770458 attribute has a cardinality of zero or one 5770460 meaning that for each instance of the Task 5770406 entity there may be one Description 5770458 attribute.

The DetailedText 5770464 attribute is a Text 5770468 datatype. The DetailedText 5770464 attribute has a cardinality of zero or one 5770466 meaning that for each instance of the Task 5770406 entity there may be one DetailedText 5770464 attribute.

The OrdinalNumberValue 5770470 attribute is an OrdinalNumberValue 5770474 datatype. The OrdinalNumberValue 5770470 attribute has a cardinality of zero or one 5770472 meaning that for each instance of the Task 5770406 entity there may be one OrdinalNumberValue 5770470 attribute.

The Activity 5770476 package includes an Activity 5770478 entity.

The Activity 5770478 entity has a cardinality of zero or n 5770480 meaning that for each instance of the QualityIssueNotification 577016 entity there may be one or more Activity 5770478 entities. The Activity 5770478 entity includes various attributes, namely QualityIssueCategoryCatalogueID 5770482, ParentQualityIssueCategoryID 5770488, QualityIssueCategoryID 5770494, ProcessingPeriod 5770500, Description 5770506, DetailedText 5770512 and OrdinalNumberValue 5770518.

The QualityIssueCategoryCatalogueID 5770482 attribute is a QualityIssueCategoryCatalogueID 5770486 datatype. The QualityIssueCategoryCatalogueID 5770482 attribute has a cardinality of zero or one 5770484 meaning that for each instance of the Activity 5770478 entity there may be one QualityIssueCategoryCatalogueID 5770482 attribute.

The ParentQualityIssueCategoryID 5770488 attribute is a QualityIssueCategoryID 5770492 datatype. The ParentQualityIssueCategoryID 5770488 attribute has a cardinality of zero or one 5770490 meaning that for each instance of the Activity 5770478 entity there may be one ParentQualityIssueCategoryID 5770488 attribute.

The QualityIssueCategoryID 5770494 attribute is a QualityIssueCategoryID 5770498 datatype. The QualityIssueCategoryID 5770494 attribute has a cardinality of zero or one 5770496 meaning that for each instance of the Activity 5770478 entity there may be one QualityIssueCategoryID 5770494 attribute.

The ProcessingPeriod 5770500 attribute is an UPPEROPEN_TIMEZONEINDEPENDENT_DateTimePeriod 5770504 datatype. The ProcessingPeriod 5770500 attribute has a cardinality of zero or one 5770502 meaning that for each instance of the Activity 5770478 entity there may be one ProcessingPeriod 5770500 attribute.

The Description 5770506 attribute is a SHORT_Description 5770510 datatype. The Description 5770506 attribute has a cardinality of zero or one 5770508 meaning that for each instance of the Activity 5770478 entity there may be one Description 5770506 attribute.

The DetailedText 5770512 attribute is a Text 5770516 datatype. The DetailedText 5770512 attribute has a cardinality of zero or one 5770514 meaning that for each instance of the Activity 5770478 entity there may be one DetailedText 5770512 attribute.

The OrdinalNumberValue 5770518 attribute is an OrdinalNumberValue 5770522 datatype. The OrdinalNumberValue 5770518 attribute has a cardinality of zero or one 5770520 meaning that for each instance of the Activity 5770478 entity there may be one OrdinalNumberValue 5770518 attribute.

The Party 5770524 package includes a Party 5770526 entity. The Party 5770524 package includes various packages, namely BuyerParty 5770530, VendorParty 5770542, EmployeeResponsibleParty 5770554 and Party 5770566.

The Party 5770526 entity has a cardinality of zero or n 5770528 meaning that for each instance of the QualityIssueNotification 577016 entity there may be one or more Party 5770526 entities.

The BuyerParty 5770530 package includes a BuyerParty 5770532 entity.

The BuyerParty 5770532 entity has a cardinality of zero or n 5770534 meaning that for each instance of the Party 5770526 entity there may be one or more BuyerParty 5770532 entities. The BuyerParty 5770532 entity includes an InternalID 5770536 attribute.

The InternalID 5770536 attribute is a PartyInternalID 5770540 datatype. The InternalID 5770536 attribute has a cardinality of zero or one 5770538 meaning that for each instance of the BuyerParty 5770532 entity there may be one InternalID 5770536 attribute.

The VendorParty 5770542 package includes a VendorParty 5770544 entity.

The VendorParty 5770544 entity has a cardinality of zero or n 5770546 meaning that for each instance of the Party 5770526 entity there may be one or more VendorParty 5770544 entities. The VendorParty 5770544 entity includes an InternalID 5770548 attribute.

The InternalID 5770548 attribute is a PartyInternalID 5770552 datatype. The InternalID 5770548 attribute has a cardinality of zero or one 5770550 meaning that for each instance of the VendorParty 5770544 entity there may be one InternalID 5770548 attribute.

The EmployeeResponsibleParty 5770554 package includes an EmployeeResponsibleParty 5770556 entity.

The EmployeeResponsibleParty 5770556 entity has a cardinality of zero or n 5770558 meaning that for each instance of the Party 5770526 entity there may be one or more EmployeeResponsibleParty 5770556 entities. The EmployeeResponsibleParty 5770556 entity includes an InternalID 5770560 attribute.

The InternalID 5770560 attribute is a PartyInternalID 5770564 datatype. The InternalID 5770560 attribute has a cardinality of zero or one 5770562 meaning that for each instance of the EmployeeResponsibleParty 5770556 entity there may be one InternalID 5770560 attribute.

The Party 5770566 package includes a Party 5770568 entity.

The Party 5770568 entity has a cardinality of zero or n 5770570 meaning that for each instance of the Party 5770526 entity there may be one or more Party 5770568 entities. The Party 5770568 entity includes various attributes, namely InternalID 5770572 and RoleCode 5770578.

The InternalID 5770572 attribute is a PartyInternalID 5770576 datatype. The InternalID 5770572 attribute has a cardinality of zero or one 5770574 meaning that for each instance of the Party 5770568 entity there may be one InternalID 5770572 attribute.

The RoleCode 5770578 attribute is a PartyRoleCode 5770582 datatype. The RoleCode 5770578 attribute has a cardinality of zero or one 5770580 meaning that for each instance of the Party 5770568 entity there may be one RoleCode 5770578 attribute.

The ProductInformation 5770584 package includes a ProductInformation 5770586 entity. The ProductInformation 5770584 package includes a Material 5770590 package.

The ProductInformation 5770586 entity has a cardinality of zero or one 5770588 meaning that for each instance of the QualityIssueNotification 577016 entity there may be one ProductInformation 5770586 entity.

The Material 5770590 package includes a Material 5770592 entity.

The Material 5770592 entity has a cardinality of zero or one 5770594 meaning that for each instance of the ProductInformation 5770586 entity there may be one Material 5770592 entity. The Material 5770592 entity includes various attributes, namely InternalID 5770596, PlantID 5770602, ProductComment 5770608, BuyerID 5770614, SellerID 5770620, ManufacturerID 5770626, BatchID 5770632 and SerialID 5770638.

The InternalID 5770596 attribute is a ProductInternalID 5770600 datatype. The InternalID 5770596 attribute has a cardinality of zero or one 5770598 meaning that for each instance of the Material 5770592 entity there may be one InternalID 5770596 attribute.

The PlantID 5770602 attribute is a PlantID 5770606 datatype. The PlantID 5770602 attribute has a cardinality of zero or one 5770604 meaning that for each instance of the Material 5770592 entity there may be one PlantID 5770602 attribute.

The ProductComment 5770608 attribute is a LANGUAGEINDEPENDENT_Comment 5770612 datatype. The ProductComment 5770608 attribute has a cardinality of zero or one 5770610 meaning that for each instance of the Material 5770592 entity there may be one ProductComment 5770608 attribute.

The BuyerID 5770614 attribute is a ProductPartyID 5770618 datatype. The BuyerID 5770614 attribute has a cardinality of zero or one 5770616 meaning that for each instance of the Material 5770592 entity there may be one BuyerID 5770614 attribute.

The SellerID 5770620 attribute is a ProductPartyID 5770624 datatype. The SellerID 5770620 attribute has a cardinality of zero or one 5770622 meaning that for each instance of the Material 5770592 entity there may be one SellerID 5770620 attribute.

The ManufacturerID 5770626 attribute is a ProductPartyID 5770630 datatype. The ManufacturerID 5770626 attribute has a cardinality of zero or one 5770628 meaning that for each instance of the Material 5770592 entity there may be one ManufacturerID 5770626 attribute.

The BatchID 5770632 attribute is a BatchED 5770636 datatype. The BatchID 5770632 attribute has a cardinality of zero or one 5770634 meaning that for each instance of the Material 5770592 entity there may be one BatchID 5770632 attribute.

The SerialID 5770638 attribute is a SerialID 5770642 datatype. The SerialID 5770638 attribute has a cardinality of zero or one 5770640 meaning that for each instance of the Material 5770592 entity there may be one SerialID 5770638 attribute.

The SalesOrderInformation 5770644 package includes a SalesOrderInformation 5770646 entity.

The SalesOrderInformation 5770646 entity has a cardinality of zero or one 5770648 meaning that for each instance of the QualityIssueNotification 577016 entity there may be one SalesOrderInformation 5770646 entity.

The BusinessTransactionDocumentReference 5770680 package includes a BusinessTransactionDocumentReference 5770682 entity. The BusinessTransactionDocumentReference 5770680 package includes various packages, namely OutboundDeliveryReference 5770686, PurchaseOrderReference 5770704, GoodsMovementReference 5770722, ProductionOrderReference 5770746, MaterialInspectionReference 5770758 and QualityIssueNotificationReference 5770770.

The BusinessTransactionDocumentReference 5770682 entity has a cardinality of zero or one 5770684 meaning that for each instance of the QualityIssueNotification 577016 entity there may be one BusinessTransactionDocumentReference 5770682 entity.

The OutboundDeliveryReference 5770686 package includes an OutboundDeliveryReference 5770688 entity.

The OutboundDeliveryReference 5770688 entity has a cardinality of zero or one 5770690 meaning that for each instance of the BusinessTransactionDocumentReference 5770682 entity there may be one OutboundDeliveryReference 5770688 entity. The OutboundDeliveryReference 5770688 entity includes various attributes, namely ID 5770692 and ItemID 5770698.

The ID 5770692 attribute is a DeliveryID 5770696 datatype. The ID 5770692 attribute has a cardinality of zero or one 5770694 meaning that for each instance of the OutboundDeliveryReference 5770688 entity there may be one ID 5770692 attribute.

The ItemID 5770698 attribute is a DeliveryItemID 5770702 datatype. The ItemID 5770698 attribute has a cardinality of zero or one 5770700 meaning that for each instance of the OutboundDeliveryReference 5770688 entity there may be one ItemID 5770698 attribute.

The PurchaseOrderReference 5770704 package includes a PurchaseOrderReference 5770706 entity.

The PurchaseOrderReference 5770706 entity has a cardinality of zero or one 5770708 meaning that for each instance of the BusinessTransactionDocumentReference 5770682 entity there may be one PurchaseOrderReference 5770706 entity. The PurchaseOrderReference 5770706 entity includes various attributes, namely ID 5770710 and ItemID 5770716.

The ID 5770710 attribute is a PurchaseOrderID 5770714 datatype. The ID 5770710 attribute has a cardinality of zero or one 5770712 meaning that for each instance of the PurchaseOrderReference 5770706 entity there may be one ID 5770710 attribute.

The ItemID 5770716 attribute is a PurchaseOrderItemID 5770720 datatype. The ItemID 5770716 attribute has a cardinality of zero or one 5770718 meaning that for each instance of the PurchaseOrderReference 5770706 entity there may be one ItemID 5770716 attribute.

The GoodsMovementReference 5770722 package includes a GoodsMovementReference 5770724 entity.

The GoodsMovementReference 5770724 entity has a cardinality of zero or one 5770726 meaning that for each instance of the BusinessTransactionDocumentReference 5770682 entity there may be one GoodsMovementReference 5770724 entity. The GoodsMovementReference 5770724 entity includes various attributes, namely ID 5770728, ItemID 5770734 and Year 5770740.

The ID 5770728 attribute is a GoodsMovementID 5770732 datatype. The ID 5770728 attribute has a cardinality of zero or one 5770730 meaning that for each instance of the GoodsMovementReference 5770724 entity there may be one ID 5770728 attribute.

The ItemID 5770734 attribute is a GoodsMovementItemID 5770738 datatype. The ItemID 5770734 attribute has a cardinality of zero or one 5770736 meaning that for each instance of the GoodsMovementReference 5770724 entity there may be one ItemID 5770734 attribute.

The Year 5770740 attribute is a Year 5770744 datatype. The Year 5770740 attribute has a cardinality of zero or one 5770742 meaning that for each instance of the GoodsMovementReference 5770724 entity there may be one Year 5770740 attribute.

The ProductionOrderReference 5770746 package includes a ProductionOrderReference 5770748 entity.

The ProductionOrderReference 5770748 entity has a cardinality of zero or one 5770750 meaning that for each instance of the BusinessTransactionDocumentReference 5770682 entity there may be one ProductionOrderReference 5770748 entity. The ProductionOrderReference 5770748 entity includes an ID 5770752 attribute.

The ID 5770752 attribute is a ProductionOrderID 5770756 datatype. The ID 5770752 attribute has a cardinality of zero or one 5770754 meaning that for each instance of the ProductionOrderReference 5770748 entity there may be one ID 5770752 attribute.

The MaterialInspectionReference 5770758 package includes a MaterialInspectionReference 5770760 entity.

The MaterialInspectionReference 5770760 entity has a cardinality of zero or one 5770762 meaning that for each instance of the BusinessTransactionDocumentReference 5770682 entity there may be one MaterialInspectionReference 5770760 entity. The MaterialInspectionReference 5770760 entity includes an ID 5770764 attribute.

The ID 5770764 attribute is a MaterialInspectionID 5770768 datatype. The ID 5770764 attribute has a cardinality of zero or one 5770766 meaning that for each instance of the MaterialInspectionReference 5770760 entity there may be one ID 5770764 attribute.

The QualityIssueNotificationReference 5770770 package includes a QualityIssueNotificationReference 5770772 entity.

The QualityIssueNotificationReference 5770772 entity has a cardinality of zero or one 5770774 meaning that for each instance of the BusinessTransactionDocumentReference 5770682 entity there may be one QualityIssueNotificationReference 5770772 entity. The QualityIssueNotificationReference 5770772 entity includes an ID 5770776 attribute.

The ID 5770776 attribute is a QualityIssueNotificationID 5770780 datatype. The ID 5770776 attribute has a cardinality of zero or one 5770778 meaning that for each instance of the QualityIssueNotificationReference 5770772 entity there may be one ID 5770776 attribute.

MessageHeader Package

A MessageHeader package groups the business information that is relevant for sending a business document in a message.

MessageHeader

A MessageHeader groups business information from the perspective of the sending application, for example, information to identify the business document in a message QualityIssueNotification Package The QualityIssueNotification package groups the QualityIssueNotification with its packages.

QualityIssueNotification

A QualityIssueNotification is a notification of nonconformance of a product. The QualityIssueNotification includes a request to take appropriate actions. QualityIssueNotifications are used to inform all involved persons about a problem or defect in a product which may also include corrective actions to be performed. QualityIssueNotifications document all the corrective actions and carried out activities completely and make them available for analysis in the long term.

The ID may be optional and may be an identifier for a quality issue notification. When no ID is given, an internal ID may be provided. The ExternalQualityIssueNotificationReference may be optional and may refer to an identifier for an external quality issue notification reference document. The IssueQualityIssueCategoryCatalogueID may be optional may refer to an identifier of a quality issue category catalogue of type issue. The IssueParentQualityIssueCategoryID may be optional and may refer to an identifier of a parent category of type issue. The IssueQualityIssueCategoryID may be optional and may refer to an identifier of a category of type issue. The ReporterInternalID may be optional and may refer to an identifier for a party which reported a quality issue notification. The ReportedDateTime may be optional and may refer to a date and time when a quality issue notification was reported. The RequestedProcessingPeriod may be optional and may refer to a period during which processing of the quality issue notification is requested. The MachineryBreakdownIndicator may be optional and may refer to an indication whether a machinery is in the state of breakdown. The MachineryMalfunctionPeriod may be optional and may refer to a period during which a machinery is not usable due to malfunction. The TypeCode and may refer to a coded representation of type of quality issue notification. The ImportanceCode may be optional and may refer to a coded representation of the importance of the quality issue notification. The ComplaintQuantity may be optional and may refer to a product quantity the customer complaints about. The ReferenceQuantity may be optional and may refer to a quantity to which a business transaction refers. If the notification deals with an internal problem, the reference quantity is the same as the production quantity. In the "Complaint quantity" field, you define how much of the production quantity is subject to complaint. The InternalNonconformingQuantity may be optional and may refer to a quantity reported as nonconforming which is accepted as it is caused internal. The ExternalNonconformingQuantity may be optional and may refer to a quantity reported as nonconforming which is not accepted as it is caused external. The ReturnedQuantity may be optional and may refer to a quantity which was returned. The ReturnedDate may be optional and may refer to a date on which the quantity was returned. The Description may be optional and may refer to a short description of the quality issue. The DetailedText may be optional and may refer to a detailed text of the quality issue. An IssueQualityIssueCategoryID can be unique in combination with an Issue ParentQualityIssueCategoryID and IssueQualityIssueCategoryCatalogueID.

Item Package

The Item Package groups the item with its packages.

Item

An Item is a specific problem or defect that was found in a product. A QualityIssueNotification refers to an item but it is also possible to create a QualityIssueNotification without. Each QualityIssueNotificationItem can have multiple causes, tasks and activities associated with it.

The MaterialInternalID may be optional and may refer to an identifier for a material. The MaterialInspectionSampleID may be optional and may refer to a unique identifier for a material inspection sample. The DefectTypeQualityIssueCategoryCatalogueID may be optional and may refer to an identifier of a quality issue defect type category catalogue. The DefectTypeParentQualityIssueCategoryID may be optional and may refer to an identifier of a defect type parent category. The DefectTypeQualityIssueCategoryID may be optional and may refer to an identifier of a defect type category. The DefectLocationQualityIssueCategoryCatalogueID may be optional and may refer to an identifier of a quality issue defect location category catalogue. The DefectLocationParentQualityIssueCategoryID may be optional and may refer to an identifier of a defect location parent category. The DefectLocationQualityIssueCategoryID may be optional and may refer to an identifier of a defect location category. The DefectNumberValue may be optional and may refer to a number of defects. The DefectClassCode may be optional and may refer to a DefectClassCode is the coded representation of a defect class. The DefectWeightingClassCode may be optional and may refer to a coded representation of a weighting of the defect with regard to the manufacture of the material, for example, relating to the required inspection effort or the follow-up effort due to defects in construction or production. The InternalNonconformingQuantity may be optional and may refer to a quantity reported as nonconforming which is accepted as it is caused internal. The ExternalNonconformingQuantity may be optional and may refer to a quantity reported as nonconforming which is not accepted as it is cause external. The Description may be optional and may refer to a description for an item. The DetailedText may be optional and may refer to a detailed text for an item. The OrdinalNumberValue may be optional and may refer to an identifier of the position of an item in a sorted list. To create an item either a DefectTypeQualityIssueCategoryID or a description may be provided. A DefectTypeQualityIssueCategoryID may be unique in combination with a DefectTypeParentQualityIssueCategoryID and DefectTypeQualityIssueCategoryCatalogueID. The QualityIssueCatalogueTypeCode of the QualityIssueCategoryCatalogueID for the allowed DefectTypeQualityIssueCategoryIDs may be "DefectType". The allowed QualityIssueCategoryIDs themselves may be inquired from the BO QualityIssueCategoryCatalogue. A DefectLocationQualityIssueCategoryID may be unique in combination with a DefectLocationParentQualityIssueCategoryID and DefectLocationQualityIssueCategoryCatalogueID.

Cause Package

A Cause package groups Cause information required for a QualityIssueNotificationItem.

Cause

A Cause is a reason that led to the occurrence of the specific problem or defect found in a product. QualityIssueCategoryCatalogueID (may be optional) refers to an identifier of a quality issue category catalogue of type Cause. ParentQualityIssueCategoryID (may be optional) refers to an identifier of a parent category of type Cause. QualityIssueCategoryID (may be optional) refers to an identifier of a category of type Cause. Description (may be optional) refers to a description for a cause. DetailedText (may be optional) refers to a detailed text for a cause. OrdinalNumberValue (may be optional) identifies the position of a cause in a sorted list. To create a cause either a QualityIssueCategoryID or a description may be provided. A QualityIssueCategoryID may be unique in combination with a ParentQualityIssueCategoryID and QualityIssueCategoryCatalogueID.

Task Package

A Task package groups Task information required for a QualityIssueNotificationItem.

Task

A Task is a long-term action which is required to rectify the specific problem or defect found in a product. Using tasks, one can plan how different people can interact to process a QualityIssueNotification and track how various activities are completed within a specified period of time. Mainly tasks may contain brief instruction describing what is to be done, responsible person, planned start and end dates for the task, and task status. Tasks for the QualityIssueNotificationItem may be referred to as "corrective tasks." These tasks may provide final solutions that may prevent a specific problem from recurring.

QualityIssueCategoryCatalogueID (may be optional) refers to an identifier of a quality issue category catalogue of type Task. ParentQualityIssueCategoryID (may be optional) refers to an identifier of a parent category of type Task. QualityIssueCategoryID (may be optional) refers to an identifier of a category of type Task. PlannedProcessingPeriod (may be optional) refers to a period during which a task is planned. EmployeeResponsibleInternalID (may be optional) refers to an EmployeeResponsibleInternalID is a proprietary identifier for an EmployeeResponsible who is responsible for processing a task. EmployeeResponsibleInternalTypeCode (may be optional) refers to an EmployeeResponsibleInternalTypeCode is the coded representation of an object type which either exists as a business partner or as an organizational centre. CompleterInternalID (may be optional) refers to an identifier of the party which completed a task. CompletionDateTime (may be optional) refers to a date and Time when a task was completed. Description (may be optional) refers to a description for a task. DetailedText (may be optional) refers to a detailed text for a task. OrdinalNumberValue (may be optional) identifies the position of a task in a sorted list. To create a task either a QualityIssueCategoryID or a description may be provided. A QualityIssueCategoryID may be unique in combination with a ParentQualityIssueCategoryID and QualityIssueCategoryCatalogueID.

Activity Package

An Activity package groups Activity information required for a QualityIssueNotificationItem.

Activity

A Activity is a short-term action that shall be executed immediately to rectify the specific problem or defect found in a product. Activities for the QualityIssueNotificationItem document what has been performed concerning an item with its specific problem or defect.

QualityIssueCategoryCatalogueID (may be optional) refers to an identifier of a quality issue category catalogue of type Activity. ParentQualityIssueCategoryID (may be optional) refers to an identifier of a parent category of type Activity. QualityIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue (may be optional) identifies the position of an activity in a sorted list. To create an activity either a QualityIssueCategoryID or a description may be provided. A QualityIssueCategoryID may be unique in combination with a ParentQualityIssueCategoryID and QualityIssueCategoryCatalogueID.

Task Package

A Task package groups Task information required for a QualityIssueNotification.

Task

A Task is a long-term action which is required to rectify all problems or defects found in a product. Using tasks, one can plan how different people can interact to process a QualityIssueNotification and track how various activities are completed within a specified period of time. Usually tasks may contain brief instruction describing what is to be done, responsible person, planned start and end dates for the task, and task status.

Tasks for the QualityIssueNotification are also referred to as "immediate tasks." These tasks usually provide a "quick fix" for the complete issue requiring immediate attention. QualityIssueCategoryCatalogueID (may be optional) refers to an identifier of a quality issue category catalogue of type Task. ParentQualityIssueCategoryID (may be optional) refers to an identifier of a parent category of type Task. QualityIssueCategoryID (may be optional) refers to an identifier of a category of type Task. PlannedProcessingPeriod (may be optional) refers to a period during which a task is planned. EmployeeResponsibleInternalID (may be optional) refers to an EmployeeResponsibleInternalID is a proprietary identifier for an EmployeeResponsible who is responsible for processing a task. EmployeeResponsibleInternalTypeCode (may be optional) refers to an EmployeeResponsibleInternalTypeCode is the coded representation of an object type which either exists as a business partner or as an organizational centre. CompleterInternalID (may be optional) refers to an identifier of the party which completed a task. CompletionDateTime (may be optional) refers to a date and Time when a task was completed. Description (may be optional) refers to a description for a task. DetailedText (may be optional) refers to a detailed text for a task. OrdinalNumberValue (may be optional) identifies the position of a task in a sorted list. To create a task either a QualityIssueCategoryID or a description may be provided. A QualityIssueCategoryID may be unique in combination with a ParentQualityIssueCategoryID and QualityIssueCategoryCatalogueID.

Activity Package

An Activity package groups Activity information required for a QualityIssueNotification.

Activity

An Activity is a short-term action that shall be executed immediately to rectify all problems or defects found in a product. Activities for the QualityIssueNotification document what has been performed concerning the complete issue.

QualityIssueCategoryCatalogueID (may be optional) refers to an identifier of a quality issue category catalogue of type Activity. ParentQualityIssueCategoryID (may be optional) refers to an identifier of a parent category of type Activity. QualityIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue (may be optional) identifies the position of an activity in a sorted list. To create an activity either a QualityIssueCategoryID or a description may be provided. A QualityIssueCategoryID may be unique in combination with a ParentQualityIssueCategoryID and QualityIssueCategoryCatalogueID.

Party Package

A Party package groups together all the business parties involved in the QualityIssueNotification. It contains the entities BuyerParty, VendorParty, EmployeeResponsibleParty, and Party.

BuyerParty

A BuyerParty is a business partner to whom materials or services are offered or provided. InternalID (may be optional) refers to an identifier for a party.

VendorParty

A VendorParty is a business partner who offers or provides materials or services. InternalID (may be optional) refers to an identifier for a party.

EmployeeResponsibleParty

An EmployeeResponsibleParty is a party that is responsible for the completion of a QualityIssueNotification. InternalID (may be optional) refers to an identifier for a party.

Party

A Party is a natural person, organization, or group that is somehow related to a QualityIssueNotification. Further parties may be added here. InternalID (may be optional) refers to an identifier for a party. RoleCode (may be optional) refers to a coded representation of a PartyRole.

ProductInformation Package

The ProductInformation package groups material information of a QualityIssueNotification. It contains the entity Material.

Material

A material is a specific good where in case of quality issue notification defects resulting from poor-quality have been found. A material may have either a batch or a serialized number. A Batch is a homogenous amount of a single material having uniform quality and properties and is generally produced during a single production process. A SerialNumber is a number which can be assigned to a physical material. The SerialNumber is used to distinguish a specific material from all the other materials with the same material-ID. The combination SerialNumber and material-ID can be unique.

InternalID (may be optional) refers to an identifier for a material. PlantID (may be optional) refers to an identifier for the plant of a material. ProductComment (may be optional) refers to a generic language independent comment for product. May be constrained to a length limited to 40 characters. BuyerID (may be optional) refers to an identifier for a material assigned by a customer. SellerID (may be optional) refers to an identifier for a material assigned by a supplier. ManufacturerID (may be optional) refers to an identifier for a material assigned by a manufacturer. BatchID (may be optional) refers to an identifier for a batch of a material. SerialID (may be optional) refers to an identifier for an individual item of a material.

SalesOrderInformation Package

The SalesOrderInformation package groups sales order information of a QualityIssueNotification. It contains the entity SalesOrderInformation.

SalesOrderInformation

A SalesOrderInformation is an agreement between a seller and a customer regarding the sale and delivery of goods associated with this at a certain time, for a certain quantity and at a certain price. ID (may be optional) refers to an identifier of a SalesOrder a QualityIssueNotification is referring to.

ItemID (may be optional) refers to an identifier for an item in a SalesOrder a QualityIssueNotification is referring to. BuyerID (may be optional) refers to an identifier for a sales order assigned by a customer. BuyerPurchaseDate (may be optional) refers to a date at which a sales order is acquired by purchasing.

BusinessTransactionDocumentReference Package

The BusinessTransactionDocumentReference package contains references to other BusinessTransactionDocuments that are related to a QualityIssueNotification. It contains the entities OutboundDeliveryReference, PurchaseOrderReference, GoodsMovementReference, ProductionOrderReference, MaterialInspectionReference, and QualityIssueNotificationReference.

OutboundDeliveryReference

The OutboundDeliveryReference refers to a composition of goods that is provided for shipping by a vendor. ID (may be optional) refers to an identifier for a OutboundDelivery a QualityIssueNotification is referring to. ItemID (may be optional) refers to an identifier for a OutboundDeliveryItem a QualityIssueNotification is referring to.

PurchaseOrderReference

A PurchaseOrderReference is a buyer's request to a seller to provide or deliver certain quantities of products at one or several dates. ID (may be optional) refers to an identifier specified by the buyer for a PurchaseOrder a QualityIssueNotification is referring to. ItemID (may be optional) refers to an identifier specified by the buyer for the PurchaseOrderItem a QualityIssueNotification is referring to.

GoodsMovementReference

A GoodsMovementReference references a GoodsMovement. GoodsMovement is a transaction resulting in a change in inventory. ID (may be optional) refers to an identifier for a GoodsMovement a QualityIssueNotification is referring to. ItemID (may be optional) refers to an identifier for a GoodsMovement item a QualityIssueNotification is referring to. Year (may be optional) refers to a year in which the GoodsMovement was created.

ProductionOrderReference

ProductionOrderReference references a ProductionOrder. ProductionOrder is an order to produce a certain amount of one or more materials in a certain time frame. ID (may be optional) refers to an identifier for a Production Order a QualityIssueNotification is referring to.

MaterialInspectionReference

A MaterialInspectionReference is the execution of an inspection for a particular material, and is used to record this inspection. ID (may be optional) refers to an identifier for a material inspection a QualityIssueNotification is referring to.

QualityIssueNotificationReference

A QualityIssueNotificationReference is the reference to a previous quality issue notification. ID (may be optional) refers to an identifier for a QualityIssueNotification.

Message Data Type

The message data type QualityIssueNotificationCreateConfirmationMessage_sync contains the business information that is relevant for sending a business document in a message, the QualityIssueNotification included in the business document, and the Log. FIG. 576 shows a QualityIssueNotificationCreateConfirmationMessage_sync 576000 package. The QualityIssueNotificationCreateConfirmationMessage_sync 576000 package is a QualityIssueNotificationCreateConfirmationMessage_sync 576004 datatype. The QualityIssueNotificationCreateConfirmationMessage_sync 576000 package includes a QualityIssueNotificationCreateConfirmationMessage_sync 576002 entity. The QualityIssueNotificationCreateConfirmationMessage_sync 576000 package includes various packages, namely MessageHeader 576006, QualityIssueNotification 576014 and Log 576032.

The MessageHeader 576006 package is a BasicBusinessDocumentMessageHeader 576012 datatype. The MessageHeader 576006 package includes a MessageHeader 576008 entity.

The MessageHeader 576008 entity has a cardinality of zero or one 576010 meaning that for each instance of the QualityIssueNotificationCreateConfirmationMessage_sync 576002 entity there may be one MessageHeader 576008 entity.

The QualityIssueNotification 576014 package includes a QualityIssueNotification 576016 entity.

The QualityIssueNotification 576016 entity has a cardinality of zero or one 576018 meaning that for each instance of the QualityIssueNotificationCreateConfirmationMessage_sync 576002 entity there may be one QualityIssueNotification 576016 entity. The QualityIssueNotification 576016 entity includes various attributes, namely ID 576020 and StatusObject 576026.

The ID 576020 attribute is a QualityIssueNotificationID 576024 datatype. The ID 576020 attribute has a cardinality of one 576022 meaning that for each instance of the QualityIssueNotification 576016 entity there is one ID 576020 attribute.

The StatusObject 576026 attribute is a StatusObject 576030 datatype. The StatusObject 576026 attribute has a cardinality of one 576028 meaning that for each instance of the QualityIssueNotification 576016 entity there is one StatusObject 576026 attribute.

The Log 576032 package is a Log 576038 datatype. The Log 576032 package includes a Log 576034 entity.

The Log 576034 entity has a cardinality of one 576036 meaning that for each instance of the QualityIssueNotificationCreateConfirmationMessage_sync 576002 entity there is one Log 576034 entity.

QualityIssueNotification Package

The QualityIssueNotification package groups the QualityIssueNotification.

QualityIssueNotification

A QualityIssueNotification is a notification of nonconformance of a product. The QualityIssueNotification includes a request to take appropriate actions. ID (may be optional) refers to an identifier for a quality issue notification. StatusObject (may be optional) refers to a StatusObject describes the processing status of a quality issue notification in structured form.

Log Package

A Log package groups the error messages used for user interaction.

Log

A Log is a sequence of messages that result when an application executes a task.

Message Data Type

FIG. 572 shows a QualityIssueNotificationByIDQueryMessage_sync 572000 package. The QualityIssueNotificationByIDQueryMessage_sync 572000 package is a QualityIssueNotificationByIDQueryMessage_sync 572004 datatype. The QualityIssueNotificationByIDQueryMessage_sync 572000 package includes a QualityIssueNotificationByIDQueryMessage_sync 572002 entity. The QualityIssueNotificationByIDQueryMessage_sync 572000 package includes a Selection 572006 package.

The Selection 572006 package includes a QualityIssueNotificationSelectionByID 572008 entity.

The QualityIssueNotificationSelectionByID 572008 entity has a cardinality of one 572010 meaning that for each instance of the QualityIssueNotificationByIDQueryMessage_sync 572002 entity there is one QualityIssueNotificationSelectionByID 572008 entity. The QualityIssueNotificationSelectionByID 572008 entity includes an ID 572012 attribute.

The ID 572012 attribute is a QualityIssueNotificationID 572016 datatype. The ID 572012 attribute has a cardinality of one 572014 meaning that for each instance of the QualityIssueNotificationSelectionByID 572008 entity there is one ID 572012 attribute.

Selection Package

QualityIssueNotificationSelectionByID

QualityIssueNotificationSelectionByID specifies selection criteria to select a QualityIssueNotification by QualityIssueNotificationID. ID (may be optional) refers to an identifier for a quality issue notification.

Message Data Type

The message data type QualityIssueNotificationByIDResponseMessage_sync contains the QualityIssueNotification included in the business document and the Log. FIGS. 573-1 through 573-37 show a QualityIssueNotificationByIDResponseMessage_sync 573000 package. The QualityIssueNotificationByIDResponseMessage_sync 573000 package is a QualityIssueNotificationByIDResponseMessage_sync 573004 datatype. The QualityIssueNotificationByIDResponseMessage_sync 573000 package includes a QualityIssueNotificationByIDResponseMessage_sync 573002 entity. The QualityIssueNotificationByIDResponseMessage_sync 573000 package includes various packages, namely QualityIssueNotification 573006 and Log 57301104.

The QualityIssueNotification 573006 package includes a QualityIssueNotification 573008 entity. The QualityIssueNotification 573006 package includes various packages, namely Item 5730174, Task 5730630, Activity 5730744, Party 5730816, ProductInformation 5730900, SalesOrderInformation 5730966 and BusinessTransactionDocumentReference 57301002.

The QualityIssueNotification 573008 entity has a cardinality of zero or one 573010 meaning that for each instance of the QualityIssueNotificationByIDResponseMessage_sync 573002 entity there may be one QualityIssueNotification 573008 entity. The QualityIssueNotification 573008 entity includes various attributes, namely ID 573012, ExternalQualityIssueNotificationReference 573018, SystemAdministrativeData 573024, StatusObject 573030, IssueCategoryFilterID 573036, IssueQualityIssueCategoryCatalogueID 573042, IssueParentQualityIssueCategoryID 573048, IssueParentQualityIssueCategoryName 573054, IssueQualityIssueCategoryID 573060, IssueQualityIssueCategoryName 573066, ReporterInternalID 573072, ReportedDateTime 573078, RequestedProcessingPeriod 573084, MachineryBreakdownIndicator 573090, MachineryMalfunctionPeriod 573096, TypeCode 5730102, TypeName 5730108, ImportanceCode 5730114, ImportanceName 5730120, ComplaintQuantity 5730126, ReferenceQuantity 5730132, InternalNonconformingQuantity 5730138, ExternalNonconformingQuantity 5730144, ReturnedQuantity 5730150, ReturnedDate 5730156, Description 5730162 and DetailedText 5730168.

The ID 573012 attribute is a QualityIssueNotificationID 573016 datatype. The ID 573012 attribute has a cardinality of one 573014 meaning that for each instance of the QualityIssueNotification 573008 entity there is one ID 573012 attribute.

The ExternalQualityIssueNotificationReference 573018 attribute is a BusinessTransactionDocumentReference 573022 datatype. The ExternalQualityIssueNotificationReference 573018 attribute has a cardinality of zero or one 573020 meaning that for each instance of the QualityIssueNotification 573008 entity there may be one ExternalQualityIssueNotificationReference 573018 attribute.

The SystemAdministrativeData 573024 attribute is a SystemAdministrativeData 573028 datatype. The SystemAdministrativeData 573024 attribute has a cardinality of one 573026 meaning that for each instance of the QualityIssueNotification 573008 entity there is one SystemAdministrativeData 573024 attribute.

The StatusObject 573030 attribute is a StatusObject 573034 datatype. The StatusObject 573030 attribute has a cardinality of one 573032 meaning that for each instance of the QualityIssueNotification 573008 entity there is one StatusObject 573030 attribute.

The IssueCategoryFilterID 573036 attribute is an IssueCategoryFilterCode 573040 datatype. The IssueCategoryFilterID 573036 attribute has a cardinality of one 573038 meaning that for each instance of the QualityIssueNotification 573008 entity there is one IssueCategoryFilterID 573036 attribute.

The IssueQualityIssueCategoryCatalogueID 573042 attribute is a QualityIssueCategoryCatalogueID 573046 datatype. The IssueQualityIssueCategoryCatalogueID 573042 attribute has a cardinality of zero or one 573044 meaning that for each instance of the QualityIssueNotification 573008 entity there may be one IssueQualityIssueCategoryCatalogueID 573042 attribute.

The IssueParentQualityIssueCategoryID 573048 attribute is a QualityIssueCategoryID 573052 datatype. The IssueParentQualityIssueCategoryID 573048 attribute has a cardinality of zero or one 573050 meaning that for each instance of the QualityIssueNotification 573008 entity there may be one IssueParentQualityIssueCategoryID 573048 attribute.

The IssueParentQualityIssueCategoryName 573054 attribute is a MEDIUM_Name 573058 datatype. The IssueParentQualityIssueCategoryName 573054 attribute has a cardinality of zero or one 573056 meaning that for each instance of the QualityIssueNotification 573008 entity there may be one IssueParentQualityIssueCategoryName 573054 attribute.

The IssueQualityIssueCategoryID 573060 attribute is a QualityIssueCategoryID 573064 datatype. The IssueQualityIssueCategoryID 573060 attribute has a cardinality of zero or one 573062 meaning that for each instance of the QualityIssueNotification 573008 entity there may be one IssueQualityIssueCategoryID 573060 attribute.

The IssueQualityIssueCategoryName 573066 attribute is a MEDIUM_Name 573070 datatype. The IssueQualityIssueCategoryName 573066 attribute has a cardinality of zero or one 573068 meaning that for each instance of the QualityIssueNotification 573008 entity there may be one IssueQualityIssueCategoryName 573066 attribute.

The ReporterInternalID 573072 attribute is a PartyInternalID 573076 datatype. The ReporterInternalID 573072 attribute has a cardinality of one 573074 meaning that for each instance of the QualityIssueNotification 573008 entity there is one ReporterInternalID 573072 attribute.

The ReportedDateTime 573078 attribute is a TIMEZONEINDEPENDENT_DateTime 573082 datatype. The ReportedDateTime 573078 attribute has a cardinality of one 573080 meaning that for each instance of the QualityIssueNotification 573008 entity there is one ReportedDateTime 573078 attribute.

The RequestedProcessingPeriod 573084 attribute is an UPPEROPEN_TIMEZONEINDEPENDENT_ DateTimePeriod 573088 datatype. The RequestedProcessingPeriod 573084 attribute has a cardinality of zero or one 573086 meaning that for each instance of the QualityIssueNotification 573008 entity there may be one RequestedProcessingPeriod 573084 attribute.

The MachineryBreakdownIndicator 573090 attribute is an Indicator 573094 datatype. The MachineryBreakdownIndicator 573090 attribute has a cardinality of zero or one 573092 meaning that for each instance of the QualityIssueNotification 573008 entity there may be one MachineryBreakdownIndicator 573090 attribute.

The MachineryMalfunctionPeriod 573096 attribute is an UPPEROPEN_TIMEZONEINDEPENDENT_ DateTimePeriod 5730100 datatype. The MachineryMalfunctionPeriod 573096 attribute has a cardinality of zero or one 573098 meaning that for each instance of the QualityIssueNotification 573008 entity there may be one MachineryMalfunctionPeriod 573096 attribute.

The TypeCode 5730102 attribute is a QualityIssueNotificationTypeCode 5730106 datatype. The TypeCode 5730102 attribute has a cardinality of one 5730104 meaning that for each instance of the QualityIssueNotification 573008 entity there is one TypeCode 5730102 attribute.

The TypeName 5730108 attribute is a MEDIUM_Name 5730112 datatype. The TypeName 5730108 attribute has a cardinality of zero or one 5730110 meaning that for each instance of the QualityIssueNotification 573008 entity there may be one TypeName 5730108 attribute.

The ImportanceCode 5730114 attribute is an ImportanceCode 5730118 datatype. The ImportanceCode 5730114 attribute has a cardinality of zero or one 5730116 meaning that for each instance of the QualityIssueNotification 573008 entity there may be one ImportanceCode 5730114 attribute.

The ImportanceName 5730120 attribute is a MEDIUM_Name 5730124 datatype. The ImportanceName 5730120 attribute has a cardinality of zero or one 5730122 meaning that for each instance of the QualityIssueNotification 573008 entity there may be one ImportanceName 5730120 attribute.

The ComplaintQuantity 5730126 attribute is a Quantity 5730130 datatype. The ComplaintQuantity 5730126 attribute has a cardinality of zero or one 5730128 meaning that for each instance of the QualityIssueNotification 573008 entity there may be one ComplaintQuantity 5730126 attribute.

The ReferenceQuantity 5730132 attribute is a Quantity 5730136 datatype. The ReferenceQuantity 5730132 attribute has a cardinality of zero or one 5730134 meaning that for each instance of the QualityIssueNotification 573008 entity there may be one ReferenceQuantity 5730132 attribute.

The InternalNonconformingQuantity 5730138 attribute is a Quantity 5730142 datatype. The InternalNonconformingQuantity 5730138 attribute has a cardinality of zero or one 5730140 meaning that for each instance of the QualityIssueNotification 573008 entity there may be one InternalNonconformingQuantity 5730138 attribute.

The ExternalNonconformingQuantity 5730144 attribute is a Quantity 5730148 datatype. The ExternalNonconformingQuantity 5730144 attribute has a cardinality of zero or one 5730146 meaning that for each instance of the QualityIssueNotification 573008 entity there may be one ExternalNonconformingQuantity 5730144 attribute.

The ReturnedQuantity 5730150 attribute is a Quantity 5730154 datatype. The ReturnedQuantity 5730150 attribute has a cardinality of zero or one 5730152 meaning that for each instance of the QualityIssueNotification 573008 entity there may be one ReturnedQuantity 5730150 attribute.

The ReturnedDate 5730156 attribute is a Date 5730160 datatype. The ReturnedDate 5730156 attribute has a cardinality of zero or one 5730158 meaning that for each instance of the QualityIssueNotification 573008 entity there may be one ReturnedDate 5730156 attribute.

The Description 5730162 attribute is a SHORT_Description 5730166 datatype. The Description 5730162 attribute has a cardinality of zero or one 5730164 meaning that for each instance of the QualityIssueNotification 573008 entity there may be one Description 5730162 attribute.

The DetailedText 5730168 attribute is a Text 5730172 datatype. The DetailedText 5730168 attribute has a cardinality of zero or one 5730170 meaning that for each instance of the QualityIssueNotification 573008 entity there may be one DetailedText 5730168 attribute.

The Item 5730174 package includes an Item 5730176 entity. The Item 5730174 package includes various packages, namely Cause 5730378, Task 5730444 and Activity 5730558.

The Item 5730176 entity has a cardinality of zero or n 5730178 meaning that for each instance of the QualityIssueNotification 573008 entity there may be one or more Item 5730176 entities. The Item 5730176 entity includes various attributes, namely ID 5730180, SystemAdministrativeData 5730186, MaterialInternalID 5730192, MaterialDescription 5730198, MaterialInspectionSampleID 5730204, MaterialInspectionSubsetOperationID 5730210, MaterialInspectionSubsetOperationDescription 5730216, MaterialInspectionSub-setOperationWorkCentreID 5730222, MaterialInspectionSubsetOperationWorkCentreDescription 5730228, MaterialInspectionSubsetOperationWorkCentrePlantID 5730234, MaterialInspectionSubsetOperationInspectionActivityID 5730240, MaterialInspectionSubsetOperationInspectionActivityDescription 5730246, DefectTypeQualityIssueCategoryCatalogueID 5730252, DefectTypeParentQualityIssueCategoryID 5730258, DefectTypeParentQualityIssueCategoryName 5730264, DefectTypeQualityIssueCategoryID 5730270, DefectTypeQualityIssueCategoryName 5730276, DefectLocationQualityIssueCategoryCatalogueID 5730282, DefectLocationParentQualityIssueCategoryID 5730288, DefectLocationParentQualityIssueCategoryName 5730294, DefectLocationQualityIssueCategoryID 5730300, DefectLocationQualityIssueCategoryName 5730306, DefectNumberValue 5730312, DefectClassCode 5730318, DefectClassName 5730324, DefectWeightingClassCode 5730330, DefectWeightingClassName 5730336, SystematicIndicator 5730342, InternalNonconformingQuantity 5730348, ExternalNonconformingQuantity 5730354, Description 5730360, DetailedText 5730366 and OrdinalNumberValue 5730372.

The ID 5730180 attribute is a QualityIssueNotificationItemID 5730184 datatype. The ID 5730180 attribute has a cardinality of one 5730182 meaning that for each instance of the Item 5730176 entity there is one ID 5730180 attribute.

The SystemAdministrativeData 5730186 attribute is a SystemAdministrativeData 5730190 datatype. The SystemAdministrativeData 5730186 attribute has a cardinality of one 5730188 meaning that for each instance of the Item 5730176 entity there is one SystemAdministrativeData 5730186 attribute.

The MaterialInternalID 5730192 attribute is a ProductInternalID 5730196 datatype. The MaterialInternalID 5730192 attribute has a cardinality of zero or one 5730194 meaning that for each instance of the Item 5730176 entity there may be one MaterialInternalID 5730192 attribute.

The MaterialDescription 5730198 attribute is a SHORT_ Description 5730202 datatype. The MaterialDescription 5730198 attribute has a cardinality of zero or one 5730200 meaning that for each instance of the Item 5730176 entity there may be one MaterialDescription 5730198 attribute.

The MaterialInspectionSampleID 5730204 attribute is a MaterialInspectionSampleID 5730208 datatype. The MaterialInspectionSampleID 5730204 attribute has a cardinality of zero or one 5730206 meaning that for each instance of the Item 5730176 entity there may be one MaterialInspectionSampleID 5730204 attribute.

The MaterialInspectionSubsetOperationID 5730210 attribute is a MaterialInspectionSubsetOperationID 5730214 datatype. The MaterialInspectionSubsetOperationED 5730210 attribute has a cardinality of zero or one 5730212 meaning that for each instance of the Item 5730176 entity there may be one MaterialInspectionSubsetOperationID 5730210 attribute.

The MaterialInspectionSubsetOperationDescription 5730216 attribute is a MEDIUM_Description 5730220 datatype. The MaterialInspectionSubsetOperationDescription 5730216 attribute has a cardinality of zero or one 5730218 meaning that for each instance of the Item 5730176 entity there may be one MaterialInspectionSubsetOperationDescription 5730216 attribute.

The MaterialInspectionSubsetOperationWorkCentreID 5730222 attribute is a WorkCentreID 5730226 datatype. The MaterialInspectionSubsetOperationWorkCentreID 5730222 attribute has a cardinality of zero or one 5730224 meaning that for each instance of the Item 5730176 entity there may be one MaterialInspectionSubsetOperationWorkCentreID 5730222 attribute.

The MaterialInspectionSubsetOperationWorkCentreDescription 5730228 attribute is a SHORT_ Description 5730232 datatype. The MaterialInspectionSubsetOperationWorkCentreDescription 5730228 attribute has a cardinality of zero or one 5730230 meaning that for each instance of the Item 5730176 entity there may be one MaterialInspectionSubsetOperationWorkCentreDescription 5730228 attribute.

The MaterialInspectionSubsetOperationWorkCentrePlantID 5730234 attribute is a PlantID 5730238 datatype. The MaterialInspectionSubsetOperationWorkCentrePlantID 5730234 attribute has a cardinality of zero or one 5730236 meaning that for each instance of the Item 5730176 entity there may be one MaterialInspectionSubsetOperationWorkCentrePlantID 5730234 attribute.

The MaterialInspectionSubsetOperationInspectionActivityID 5730240 attribute is a MaterialInspectionSubsetOperationInspectionActivityID 5730244 datatype. The MaterialInspectionSubsetOperationInspectionActivityID 5730240 attribute has a cardinality of zero or one 5730242 meaning that for each instance of the Item 5730176 entity there may be one MaterialInspectionSubsetOperationInspectionActivityID 5730240 attribute.

The MaterialInspectionSubsetOperationInspectionActivityDescription 5730246 attribute is a MEDIUM_Description 5730250 datatype. The MaterialInspectionSubsetOperationInspectionActivityDescription 5730246 attribute has a cardinality of zero or one 5730248 meaning that for each instance of the Item 5730176 entity there may be one MaterialInspectionSubsetOperationInspectionActivityDescription 5730246 attribute.

The DefectTypeQualityIssueCategoryCatalogueID 5730252 attribute is a QualityIssueCategoryCatalogueID 5730256 datatype. The DefectTypeQualityIssueCategoryCatalogueID 5730252 attribute has a cardinality of zero or one 5730254 meaning that for each instance of the Item 5730176 entity there may be one DefectTypeQualityIssueCategoryCatalogueID 5730252 attribute.

The DefectTypeParentQualityIssueCategoryID 5730258 attribute is a QualityIssueCategoryID 5730262 datatype. The DefectTypeParentQualityIssueCategoryID 5730258 attribute has a cardinality of zero or one 5730260 meaning that for each instance of the Item 5730176 entity there may be one DefectTypeParentQualityIssueCategoryID 5730258 attribute.

The DefectTypeParentQualityIssueCategoryName 5730264 attribute is a MEDIUM_Name 5730268 datatype. The DefectTypeParentQualityIssueCategoryName 5730264 attribute has a cardinality of zero or one 5730266 meaning that for each instance of the Item 5730176 entity there may be one DefectTypeParentQualityIssueCategoryName 5730264 attribute.

The DefectTypeQualityIssueCategoryID 5730270 attribute is a QualityIssueCategoryID 5730274 datatype. The DefectTypeQualityIssueCategoryID 5730270 attribute has a cardinality of zero or one 5730272 meaning that for each instance of the Item 5730176 entity there may be one DefectTypeQualityIssueCategoryID 5730270 attribute.

The DefectTypeQualityIssueCategoryName 5730276 attribute is a MEDIUM_Name 5730280 datatype. The DefectTypeQualityIssueCategoryName 5730276 attribute has a cardinality of zero or one 5730278 meaning that for each instance of the Item 5730176 entity there may be one DefectTypeQualityIssueCategoryName 5730276 attribute.

The DefectLocationQualityIssueCategoryCatalogueID 5730282 attribute is a QualityIssueCategoryCatalogueID 5730286 datatype. The DefectLocationQualityIssueCategoryCatalogueID 5730282 attribute has a cardinality of zero or one 5730284 meaning that for each instance of the Item 5730176 entity there may be one DefectLocationQualityIssueCategoryCatalogueID 5730282 attribute.

The DefectLocationParentQualityIssueCategoryID 5730288 attribute is a QualityIssueCategoryID 5730292 datatype. The DefectLocationParentQualityIssueCategoryID 5730288 attribute has a cardinality of zero or one 5730290 meaning that for each instance of the Item 5730176 entity there may be one DefectLocationParentQualityIssueCategoryID 5730288 attribute.

The DefectLocationParentQualityIssueCategoryName 5730294 attribute is a MEDIUM_Name 5730298 datatype. The DefectLocationParentQualityIssueCategoryName 5730294 attribute has a cardinality of zero or one 5730296 meaning that for each instance of the Item 5730176 entity there may be one DefectLocationParentQualityIssueCategoryName 5730294 attribute.

The DefectLocationQualityIssueCategoryID 5730300 attribute is a QualityIssueCategoryID 5730304 datatype. The DefectLocationQualityIssueCategoryID 5730300 attribute has a cardinality of zero or one 5730302 meaning that for each instance of the Item 5730176 entity there may be one DefectLocationQualityIssueCategoryID 5730300 attribute.

The DefectLocationQualityIssueCategoryName 5730306 attribute is a MEDIUM_Name 5730310 datatype. The DefectLocationQualityIssueCategoryName 5730306 attribute has a cardinality of zero or one 5730308 meaning that for each instance of the Item 5730176 entity there may be one DefectLocationQualityIssueCategoryName 5730306 attribute.

The DefectNumberValue 5730312 attribute is a NumberValue 5730316 datatype. The DefectNumberValue 5730312 attribute has a cardinality of zero or one 5730314 meaning that for each instance of the Item 5730176 entity there may be one DefectNumberValue 5730312 attribute.

The DefectClassCode 5730318 attribute is a DefectClassCode 5730322 datatype. The DefectClassCode 5730318 attribute has a cardinality of zero or one 5730320 meaning that for each instance of the Item 5730176 entity there may be one DefectClassCode 5730318 attribute.

The DefectClassName 5730324 attribute is a MEDIUM_Name 5730328 datatype. The DefectClassName 5730324 attribute has a cardinality of zero or one 5730326 meaning that for each instance of the Item 5730176 entity there may be one DefectClassName 5730324 attribute.

The DefectWeightingClassCode 5730330 attribute is a DefectWeightingClassCode 5730334 datatype. The DefectWeightingClassCode 5730330 attribute has a cardinality of zero or one 5730332 meaning that for each instance of the Item 5730176 entity there may be one DefectWeightingClassCode 5730330 attribute.

The DefectWeightingClassName 5730336 attribute is a MEDIUM_Name 5730340 datatype. The DefectWeightingClassName 5730336 attribute has a cardinality of zero or one 5730338 meaning that for each instance of the Item 5730176 entity there may be one DefectWeightingClassName 5730336 attribute.

The SystematicIndicator 5730342 attribute is an Indicator 5730346 datatype. The SystematicIndicator 5730342 attribute has a cardinality of zero or one 5730344 meaning that for each instance of the Item 5730176 entity there may be one SystematicIndicator 5730342 attribute.

The InternalNonconformingQuantity 5730348 attribute is a Quantity 5730352 datatype. The InternalNonconformingQuantity 5730348 attribute has a cardinality of zero or one 5730350 meaning that for each instance of the Item 5730176 entity there may be one InternalNonconformingQuantity 5730348 attribute.

The ExternalNonconformingQuantity 5730354 attribute is a Quantity 5730358 datatype. The ExternalNonconformingQuantity 5730354 attribute has a cardinality of zero or one 5730356 meaning that for each instance of the Item 5730176 entity there may be one ExternalNonconformingQuantity 5730354 attribute.

The Description 5730360 attribute is a SHORT_Description 5730364 datatype. The Description 5730360 attribute has a cardinality of zero or one 5730362 meaning that for each instance of the Item 5730176 entity there may be one Description 5730360 attribute.

The DetailedText 5730366 attribute is a Text 5730370 datatype. The DetailedText 5730366 attribute has a cardinality of zero or one 5730368 meaning that for each instance of the Item 5730176 entity there may be one DetailedText 5730366 attribute.

The OrdinalNumberValue 5730372 attribute is an OrdinalNumberValue 5730376 datatype. The OrdinalNumberValue 5730372 attribute has a cardinality of zero or one 5730374 meaning that for each instance of the Item 5730176 entity there may be one OrdinalNumberValue 5730372 attribute.

The Cause 5730378 package includes a Cause 5730380 entity.

The Cause 5730380 entity has a cardinality of zero or n 5730382 meaning that for each instance of the Item 5730176 entity there may be one or more Cause 5730380 entities. The Cause 5730380 entity includes various attributes, namely QualityIssueNotificationCauseID 5730384, SystemAdministrativeData 5730390, QualityIssueCategoryCatalogueID 5730396, ParentQualityIssueCategoryID 5730402, ParentQualityIssueCategoryName 5730408, QualityIssueCategoryID 5730414, QualityIssueCategoryName 5730420, Description 5730426, DetailedText 5730432 and OrdinalNumberValue 5730438.

The QualityIssueNotificationCauseID 5730384 attribute is a QualityIssueNotificationCauseID 5730388 datatype. The QualityIssueNotificationCauseID 5730384 attribute has a cardinality of one 5730386 meaning that for each instance of the Cause 5730380 entity there is one QualityIssueNotificationCauseID 5730384 attribute.

The SystemAdministrativeData 5730390 attribute is a SystemAdministrativeData 5730394 datatype. The SystemAdministrativeData 5730390 attribute has a cardinality of one 5730392 meaning that for each instance of the Cause 5730380 entity there is one SystemAdministrativeData 5730390 attribute.

The QualityIssueCategoryCatalogueID 5730396 attribute is a QualityIssueCategoryCatalogueID 5730400 datatype. The QualityIssueCategoryCatalogueID 5730396 attribute has a cardinality of zero or one 5730398 meaning that for each instance of the Cause 5730380 entity there may be one QualityIssueCategoryCatalogueID 5730396 attribute.

The ParentQualityIssueCategoryID 5730402 attribute is a QualityIssueCategoryID 5730406 datatype. The ParentQualityIssueCategoryID 5730402 attribute has a cardinality of zero or one 5730404 meaning that for each instance of the Cause 5730380 entity there may be one ParentQualityIssueCategoryID 5730402 attribute.

The ParentQualityIssueCategoryName 5730408 attribute is a MEDIUM_Name 5730412 datatype. The ParentQualityIssueCategoryName 5730408 attribute has a cardinality of zero or one 5730410 meaning that for each instance of the Cause 5730380 entity there may be one ParentQualityIssueCategoryName 5730408 attribute.

The QualityIssueCategoryID 5730414 attribute is a QualityIssueCategoryID 5730418 datatype. The QualityIssueCategoryID 5730414 attribute has a cardinality of zero or one 5730416 meaning that for each instance of the Cause 5730380 entity there may be one QualityIssueCategoryID 5730414 attribute.

The QualityIssueCategoryName 5730420 attribute is a MEDIUM_Name 5730424 datatype. The QualityIssueCategoryName 5730420 attribute has a cardinality of zero or one 5730422 meaning that for each instance of the Cause 5730380 entity there may be one QualityIssueCategoryName 5730420 attribute.

The Description 5730426 attribute is a SHORT_Description 5730430 datatype. The Description 5730426 attribute has a cardinality of zero or one 5730428 meaning that for each instance of the Cause 5730380 entity there may be one Description 5730426 attribute.

The DetailedText 5730432 attribute is a Text 5730436 datatype. The DetailedText 5730432 attribute has a cardinality of zero or one 5730434 meaning that for each instance of the Cause 5730380 entity there may be one DetailedText 5730432 attribute.

The OrdinalNumberValue 5730438 attribute is an OrdinalNumberValue 5730442 datatype. The OrdinalNumberValue 5730438 attribute has a cardinality of zero or one 5730440 meaning that for each instance of the Cause 5730380 entity there may be one OrdinalNumberValue 5730438 attribute.

The Task 5730444 package includes a Task 5730446 entity.

The Task 5730446 entity has a cardinality of zero or n 5730448 meaning that for each instance of the Item 5730176 entity there may be one or more Task 5730446 entities. The Task 5730446 entity includes various attributes, namely QualityIssueNotificationTaskID 5730450, SystemAdministrativeData 5730456, StatusObject 5730462, PlannedProcessingPeriod 5730468, EmployeeResponsibleInternalID 5730474, EmployeeResponsibleInternalTypeCode 5730480, EmployeeResponsibleFormattedName 5730486, CompleterInternalID 5730492, CompleterInternalName 5730498, CompletionDateTime 5730504, QualityIssueCategoryCatalogueID 5730510, ParentQualityIssueCategoryID 5730516, ParentQualityIssueCategoryName 5730522, QualityIssueCategoryID 5730528, QualityIssueCategoryName 5730534, Description 5730540, DetailedText 5730546 and OrdinalNumberValue 5730552.

The QualityIssueNotificationTaskID 5730450 attribute is a QualityIssueNotificationTaskID 5730454 datatype. The QualityIssueNotificationTaskID 5730450 attribute has a cardinality of one 5730452 meaning that for each instance of the Task 5730446 entity there is one QualityIssueNotificationTaskID 5730450 attribute.

The SystemAdministrativeData 5730456 attribute is a SystemAdministrativeData 5730460 datatype. The SystemAdministrativeData 5730456 attribute has a cardinality of one 5730458 meaning that for each instance of the Task 5730446 entity there is one SystemAdministrativeData 5730456 attribute.

The StatusObject 5730462 attribute is a StatusObject 5730466 datatype. The StatusObject 5730462 attribute has a cardinality of one 5730464 meaning that for each instance of the Task 5730446 entity there is one StatusObject 5730462 attribute.

The PlannedProcessingPeriod 5730468 attribute is an UPPEROPEN_TIMEZONEINDEPENDENT_ DateTimePeriod 5730472 datatype. The PlannedProcessingPeriod 5730468 attribute has a cardinality of zero or one 5730470 meaning that for each instance of the Task 5730446 entity there may be one PlannedProcessingPeriod 5730468 attribute.

The EmployeeResponsibleInternalID 5730474 attribute is a PartyInternalID 5730478 datatype. The EmployeeResponsibleInternalID 5730474 attribute has a cardinality of zero or one 5730476 meaning that for each instance of the Task 5730446 entity there may be one EmployeeResponsibleInternalID 5730474 attribute.

The EmployeeResponsibleInternalTypeCode 5730480 attribute is a BusinessObjectTypeCode 5730484 datatype. The EmployeeResponsibleInternalTypeCode 5730480 attribute has a cardinality of zero or one 5730482 meaning that for each instance of the Task 5730446 entity there may be one EmployeeResponsibleInternalTypeCode 5730480 attribute.

The EmployeeResponsibleFormattedName 5730486 attribute is a LONG_Name 5730490 datatype. The EmployeeResponsibleFormattedName 5730486 attribute has a cardinality of zero or one 5730488 meaning that for each instance of the Task 5730446 entity there may be one EmployeeResponsibleFormattedName 5730486 attribute.

The CompleterInternalID 5730492 attribute is a PartyInternalID 5730496 datatype. The CompleterInternalID 5730492 attribute has a cardinality of zero or one 5730494 meaning that for each instance of the Task 5730446 entity there may be one CompleterInternalID 5730492 attribute.

The CompleterInternalName 5730498 attribute is a LONG_Name 5730502 datatype. The CompleterInternalName 5730498 attribute has a cardinality of zero or one 5730500 meaning that for each instance of the Task 5730446 entity there may be one CompleterInternalName 5730498 attribute.

The CompletionDateTime 5730504 attribute is a TIMEZONEINDEPENDENT_DateTime 5730508 datatype. The CompletionDateTime 5730504 attribute has a cardinality of zero or one 5730506 meaning that for each instance of the Task 5730446 entity there may be one CompletionDateTime 5730504 attribute.

The QualityIssueCategoryCatalogueID 5730510 attribute is a QualityIssueCategoryCatalogueID 5730514 datatype. The QualityIssueCategoryCatalogueID 5730510 attribute has a cardinality of zero or one 5730512 meaning that for each instance of the Task 5730446 entity there may be one QualityIssueCategoryCatalogueID 5730510 attribute.

The ParentQualityIssueCategoryID 5730516 attribute is a QualityIssueCategoryID 5730520 datatype. The ParentQualityIssueCategoryID 5730516 attribute has a cardinality of zero or one 5730518 meaning that for each instance of the Task 5730446 entity there may be one ParentQualityIssueCategoryID 5730516 attribute.

The ParentQualityIssueCategoryName 5730522 attribute is a MEDIUM_Name 5730526 datatype. The ParentQualityIssueCategoryName 5730522 attribute has a cardinality of zero or one 5730524 meaning that for each instance of the Task 5730446 entity there may be one ParentQualityIssueCategoryName 5730522 attribute.

The QualityIssueCategoryID 5730528 attribute is a QualityIssueCategoryID 5730532 datatype. The QualityIssueCategoryID 5730528 attribute has a cardinality of zero or one 5730530 meaning that for each instance of the Task 5730446 entity there may be one QualityIssueCategoryID 5730528 attribute.

The QualityIssueCategoryName 5730534 attribute is a MEDIUM_Name 5730538 datatype. The QualityIssueCategoryName 5730534 attribute has a cardinality of zero or one 5730536 meaning that for each instance of the Task 5730446 entity there may be one QualityIssueCategoryName 5730534 attribute.

The Description 5730540 attribute is a SHORT_Description 5730544 datatype. The Description 5730540 attribute has a cardinality of zero or one 5730542 meaning that for each instance of the Task 5730446 entity there may be one Description 5730540 attribute.

The DetailedText 5730546 attribute is a Text 5730550 datatype. The DetailedText 5730546 attribute has a cardinality of zero or one 5730548 meaning that for each instance of the Task 5730446 entity there may be one DetailedText 5730546 attribute.

The OrdinalNumberValue 5730552 attribute is an OrdinalNumberValue 5730556 datatype. The OrdinalNumberValue 5730552 attribute has a cardinality of zero or one 5730554 meaning that for each instance of the Task 5730446 entity there may be one OrdinalNumberValue 5730552 attribute.

The Activity 5730558 package includes an Activity 5730560 entity.

The Activity 5730560 entity has a cardinality of zero or n 5730562 meaning that for each instance of the Item 5730176 entity there may be one or more Activity 5730560 entities. The Activity 5730560 entity includes various attributes, namely QualityIssueNotificationActivityID 5730564, SystemAdministrativeData 5730570, ProcessingPeriod 5730576, QualityIssueCategoryCatalogueID 5730582, ParentQualityIssueCategoryID 5730588, ParentQualityIssueCategoryName 5730594, QualityIssueCategoryID 5730600, QualityIssueCategoryName 5730606, Description 5730612, DetailedText 5730618 and OrdinalNumberValue 5730624.

The QualityIssueNotificationActivityID 5730564 attribute is a QualityIssueNotificationActivityID 5730568 datatype. The QualityIssueNotificationActivityID 5730564 attribute has a cardinality of one 5730566 meaning that for each instance of the Activity 5730560 entity there is one QualityIssueNotificationActivityID 5730564 attribute.

The SystemAdministrativeData 5730570 attribute is a SystemAdministrativeData 5730574 datatype. The SystemAdministrativeData 5730570 attribute has a cardinality of one 5730572 meaning that for each instance of the Activity 5730560 entity there is one SystemAdministrativeData 5730570 attribute.

The ProcessingPeriod 5730576 attribute is an UPPEROPEN_TIMEZONEINDEPENDENT_DateTimePeriod 5730580 datatype. The ProcessingPeriod 5730576 attribute has a cardinality of zero or one 5730578 meaning that for each instance of the Activity 5730560 entity there may be one ProcessingPeriod 5730576 attribute.

The QualityIssueCategoryCatalogueID 5730582 attribute is a QualityIssueCategoryCatalogueID 5730586 datatype. The QualityIssueCategoryCatalogueID 5730582 attribute has a cardinality of zero or one 5730584 meaning that for each instance of the Activity 5730560 entity there may be one QualityIssueCategoryCatalogueID 5730582 attribute.

The ParentQualityIssueCategoryID 5730588 attribute is a QualityIssueCategoryID 5730592 datatype. The ParentQualityIssueCategoryID 5730588 attribute has a cardinality of zero or one 5730590 meaning that for each instance of the Activity 5730560 entity there may be one ParentQualityIssueCategoryID 5730588 attribute.

The ParentQualityIssueCategoryName 5730594 attribute is a MEDIUM_Name 5730598 datatype. The ParentQualityIssueCategoryName 5730594 attribute has a cardinality of zero or one 5730596 meaning that for each instance of the Activity 5730560 entity there may be one ParentQualityIssueCategoryName 5730594 attribute.

The QualityIssueCategoryID 5730600 attribute is a QualityIssueCategoryID 5730604 datatype. The QualityIssueCategoryID 5730600 attribute has a cardinality of zero or one 5730602 meaning that for each instance of the Activity 5730560 entity there may be one QualityIssueCategoryID 5730600 attribute.

The QualityIssueCategoryName 5730606 attribute is a MEDIUM_Name 5730610 datatype. The QualityIssueCategoryName 5730606 attribute has a cardinality of zero or one 5730608 meaning that for each instance of the Activity 5730560 entity there may be one QualityIssueCategoryName 5730606 attribute.

The Description 5730612 attribute is a SHORT_Description 5730616 datatype. The Description 5730612 attribute has a cardinality of zero or one 5730614 meaning that for each instance of the Activity 5730560 entity there may be one Description 5730612 attribute.

The DetailedText 5730618 attribute is a Text 5730622 datatype. The DetailedText 5730618 attribute has a cardinality of zero or one 5730620 meaning that for each instance of the Activity 5730560 entity there may be one DetailedText 5730618 attribute.

The OrdinalNumberValue 5730624 attribute is an OrdinalNumberValue 5730628 datatype. The OrdinalNumberValue 5730624 attribute has a cardinality of zero or one 5730626 meaning that for each instance of the Activity 5730560 entity there may be one OrdinalNumberValue 5730624 attribute.

The Task 5730630 package includes a Task 5730632 entity.

The Task 5730632 entity has a cardinality of zero or n 5730634 meaning that for each instance of the QualityIssueNotification 573008 entity there may be one or more Task 5730632 entities. The Task 5730632 entity includes various attributes, namely ID 5730636, SystemAdministrativeData 5730642, StatusObject 5730648, PlannedProcessingPeriod 5730654, EmployeeResponsibleInternalID 5730660, EmployeeResponsibleInternalTypeCode 5730666, EmployeeResponsibleFormattedName 5730672, CompleterInternalID 5730678, CompleterInternalName 5730684, CompletionDateTime 5730690, QualityIssueCategoryCatalogueID 5730696, ParentQualityIssueCategoryID 5730702, ParentQualityIssueCategoryName 5730708, QualityIssueCategoryID 5730714, QualityIssueCategoryName 5730720, Description 5730726, DetailedText 5730732 and OrdinalNumberValue 5730738.

The ID 5730636 attribute is a QualityIssueNotificationTaskID 5730640 datatype. The ID 5730636 attribute has a cardinality of one 5730638 meaning that for each instance of the Task 5730632 entity there is one ID 5730636 attribute.

The SystemAdministrativeData 5730642 attribute is a SystemAdministrativeData 5730646 datatype. The SystemAdministrativeData 5730642 attribute has a cardinality of one 5730644 meaning that for each instance of the Task 5730632 entity there is one SystemAdministrativeData 5730642 attribute.

The StatusObject 5730648 attribute is a StatusObject 5730652 datatype. The StatusObject 5730648 attribute has a cardinality of one 5730650 meaning that for each instance of the Task 5730632 entity there is one StatusObject 5730648 attribute.

The PlannedProcessingPeriod 5730654 attribute is an UPPEROPEN_TIMEZONEINDEPENDENT_ DateTimePeriod 5730658 datatype. The PlannedProcessingPeriod 5730654 attribute has a cardinality of zero or one 5730656 meaning that for each instance of the Task 5730632 entity there may be one PlannedProcessingPeriod 5730654 attribute.

The EmployeeResponsibleInternalID 5730660 attribute is a PartyInternalID 5730664 datatype. The EmployeeResponsibleInternalID 5730660 attribute has a cardinality of zero or one 5730662 meaning that for each instance of the Task 5730632 entity there may be one EmployeeResponsibleInternalID 5730660 attribute.

The EmployeeResponsibleInternalTypeCode 5730666 attribute is a BusinessObjectTypeCode 5730670 datatype. The EmployeeResponsibleInternalTypeCode 5730666 attribute has a cardinality of zero or one 5730668 meaning that for each instance of the Task 5730632 entity there may be one EmployeeResponsibleInternalTypeCode 5730666 attribute.

The EmployeeResponsibleFormattedName 5730672 attribute is a LONG_Name 5730676 datatype. The EmployeeResponsibleFormattedName 5730672 attribute has a cardinality of zero or one 5730674 meaning that for each instance of the Task 5730632 entity there may be one EmployeeResponsibleFormattedName 5730672 attribute.

The CompleterInternalID 5730678 attribute is a PartyInternalID 5730682 datatype. The CompleterInternalID 5730678 attribute has a cardinality of zero or one 5730680 meaning that for each instance of the Task 5730632 entity there may be one CompleterInternalID 5730678 attribute.

The CompleterInternalName 5730684 attribute is a LONG_Name 5730688 datatype. The CompleterInternalName 5730684 attribute has a cardinality of zero or one 5730686 meaning that for each instance of the Task 5730632 entity there may be one CompleterInternalName 5730684 attribute.

The CompletionDateTime 5730690 attribute is a TIMEZONEINDEPENDENT_DateTime 5730694 datatype. The CompletionDateTime 5730690 attribute has a cardinality of zero or one 5730692 meaning that for each instance of the Task 5730632 entity there may be one CompletionDateTime 5730690 attribute.

The QualityIssueCategoryCatalogueID 5730696 attribute is a QualityIssueCategoryCatalogueID 5730700 datatype.

The QualityIssueCategoryCatalogueID 5730696 attribute has a cardinality of zero or one 5730698 meaning that for each instance of the Task 5730632 entity there may be one QualityIssueCategoryCatalogueID 5730696 attribute.

The ParentQualityIssueCategoryID 5730702 attribute is a QualityIssueCategoryID 5730706 datatype. The ParentQualityIssueCategoryID 5730702 attribute has a cardinality of zero or one 5730704 meaning that for each instance of the Task 5730632 entity there may be one ParentQualityIssueCategoryID 5730702 attribute.

The ParentQualityIssueCategoryName 5730708 attribute is a MEDIUM_Name 5730712 datatype. The ParentQualityIssueCategoryName 5730708 attribute has a cardinality of zero or one 5730710 meaning that for each instance of the Task 5730632 entity there may be one ParentQualityIssueCategoryName 5730708 attribute.

The QualityIssueCategoryID 5730714 attribute is a QualityIssueCategoryID 5730718 datatype. The QualityIssueCategoryID 5730714 attribute has a cardinality of zero or one 5730716 meaning that for each instance of the Task 5730632 entity there may be one QualityIssueCategoryID 5730714 attribute.

The QualityIssueCategoryName 5730720 attribute is a MEDIUM_Name 5730724 datatype. The QualityIssueCategoryName 5730720 attribute has a cardinality of zero or one 5730722 meaning that for each instance of the Task 5730632 entity there may be one QualityIssueCategoryName 5730720 attribute.

The Description 5730726 attribute is a SHORT_Description 5730730 datatype. The Description 5730726 attribute has a cardinality of zero or one 5730728 meaning that for each instance of the Task 5730632 entity there may be one Description 5730726 attribute.

The DetailedText 5730732 attribute is a Text 5730736 datatype. The DetailedText 5730732 attribute has a cardinality of zero or one 5730734 meaning that for each instance of the Task 5730632 entity there may be one DetailedText 5730732 attribute.

The OrdinalNumberValue 5730738 attribute is an OrdinalNumberValue 5730742 datatype. The OrdinalNumberValue 5730738 attribute has a cardinality of zero or one 5730740 meaning that for each instance of the Task 5730632 entity there may be one OrdinalNumberValue 5730738 attribute.

The Activity 5730744 package includes an Activity 5730746 entity.

The Activity 5730746 entity has a cardinality of zero or n 5730748 meaning that for each instance of the QualityIssueNotification 573008 entity there may be one or more Activity 5730746 entities. The Activity 5730746 entity includes various attributes, namely ID 5730750, SystemAdministrativeData 5730756, ProcessingPeriod 5730762, QualityIssueCategoryCatalogueID 5730768, ParentQualityIssueCategoryID 5730774, ParentQualityIssueCategoryName 5730780, QualityIssueCategoryID 5730786, QualityIssueCategoryName 5730792, Description 5730798, DetailedText 5730804 and OrdinalNumberValue 5730810.

The ID 5730750 attribute is a QualityIssueNotificationActivityID 5730754 datatype. The ID 5730750 attribute has a cardinality of one 5730752 meaning that for each instance of the Activity 5730746 entity there is one ID 5730750 attribute.

The SystemAdministrativeData 5730756 attribute is a SystemAdministrativeData 5730760 datatype. The SystemAdministrativeData 5730756 attribute has a cardinality of one 5730758 meaning that for each instance of the Activity 5730746 entity there is one SystemAdministrativeData 5730756 attribute.

The ProcessingPeriod 5730762 attribute is an UPPEROPEN_TIMEZONEINDEPENDENT_DateTimePeriod 5730766 datatype. The ProcessingPeriod 5730762 attribute has a cardinality of zero or one 5730764 meaning that for each instance of the Activity 5730746 entity there may be one ProcessingPeriod 5730762 attribute.

The QualityIssueCategoryCatalogueID 5730768 attribute is a QualityIssueCategoryCatalogueID 5730772 datatype. The QualityIssueCategoryCatalogueID 5730768 attribute has a cardinality of zero or one 5730770 meaning that for each instance of the Activity 5730746 entity there may be one QualityIssueCategoryCatalogueID 5730768 attribute.

The ParentQualityIssueCategoryID 5730774 attribute is a QualityIssueCategoryID 5730778 datatype. The ParentQualityIssueCategoryID 5730774 attribute has a cardinality of zero or one 5730776 meaning that for each instance of the Activity 5730746 entity there may be one ParentQualityIssueCategoryID 5730774 attribute.

The ParentQualityIssueCategoryName 5730780 attribute is a MEDIUM_Name 5730784 datatype. The ParentQualityIssueCategoryName 5730780 attribute has a cardinality of zero or one 5730782 meaning that for each instance of the Activity 5730746 entity there may be one ParentQualityIssueCategoryName 5730780 attribute.

The QualityIssueCategoryID 5730786 attribute is a QualityIssueCategoryID 5730790 datatype. The QualityIssueCategoryID 5730786 attribute has a cardinality of zero or one 5730788 meaning that for each instance of the Activity 5730746 entity there may be one QualityIssueCategoryID 5730786 attribute.

The QualityIssueCategoryName 5730792 attribute is a MEDIUM_Name 5730796 datatype. The QualityIssueCategoryName 5730792 attribute has a cardinality of zero or one 5730794 meaning that for each instance of the Activity 5730746 entity there may be one QualityIssueCategoryName 5730792 attribute.

The Description 5730798 attribute is a SHORT_Description 5730802 datatype. The Description 5730798 attribute has a cardinality of zero or one 5730800 meaning that for each instance of the Activity 5730746 entity there may be one Description 5730798 attribute.

The DetailedText 5730804 attribute is a Text 5730808 datatype. The DetailedText 5730804 attribute has a cardinality of zero or one 5730806 meaning that for each instance of the Activity 5730746 entity there may be one DetailedText 5730804 attribute.

The OrdinalNumberValue 5730810 attribute is an OrdinalNumberValue 5730814 datatype. The OrdinalNumberValue 5730810 attribute has a cardinality of zero or one 5730812 meaning that for each instance of the Activity 5730746 entity there may be one OrdinalNumberValue 5730810 attribute.

The Party 5730816 package includes a Party 5730818 entity. The Party 5730816 package includes various packages, namely BuyerParty 5730822, VendorParty 5730840, EmployeeResponsibleParty 5730858 and Party 5730876.

The Party 5730818 entity has a cardinality of zero or n 5730820 meaning that for each instance of the QualityIssueNotification 573008 entity there may be one or more Party 5730818 entities.

The BuyerParty 5730822 package includes a BuyerParty 5730824 entity.

The BuyerParty 5730824 entity has a cardinality of zero or n 5730826 meaning that for each instance of the Party 5730818 entity there may be one or more BuyerParty 5730824 entities. The BuyerParty 5730824 entity includes various attributes, namely InternalID 5730828 and FormattedName 5730834.

The InternalID 5730828 attribute is a PartyInternalID 5730832 datatype. The InternalID 5730828 attribute has a cardinality of one 5730830 meaning that for each instance of the BuyerParty 5730824 entity there is one InternalID 5730828 attribute.

The FormattedName 5730834 attribute is a LONG_Name 5730838 datatype. The FormattedName 5730834 attribute has a cardinality of zero or one 5730836 meaning that for each instance of the BuyerParty 5730824 entity there may be one FormattedName 5730834 attribute.

The VendorParty 5730840 package includes a VendorParty 5730842 entity.

The VendorParty 5730842 entity has a cardinality of zero or n 5730844 meaning that for each instance of the Party 5730818 entity there may be one or more VendorParty 5730842 entities. The VendorParty 5730842 entity includes various attributes, namely InternalID 5730846 and FormattedName 5730852.

The InternalID 5730846 attribute is a PartyInternalID 5730850 datatype. The InternalID 5730846 attribute has a cardinality of one 5730848 meaning that for each instance of the VendorParty 5730842 entity there is one InternalID 5730846 attribute.

The FormattedName 5730852 attribute is a LONG_Name 5730856 datatype. The FormattedName 5730852 attribute has a cardinality of zero or one 5730854 meaning that for each instance of the VendorParty 5730842 entity there may be one FormattedName 5730852 attribute.

The EmployeeResponsibleParty 5730858 package includes an EmployeeResponsibleParty 5730860 entity.

The EmployeeResponsibleParty 5730860 entity has a cardinality of zero or n 5730862 meaning that for each instance of the Party 5730818 entity there may be one or more EmployeeResponsibleParty 5730860 entities. The EmployeeResponsibleParty 5730860 entity includes various attributes, namely InternalID 5730864 and FormattedName 5730870.

The InternalID 5730864 attribute is a PartyInternalID 5730868 datatype. The InternalID 5730864 attribute has a cardinality of one 5730866 meaning that for each instance of the EmployeeResponsibleParty 5730860 entity there is one InternalID 5730864 attribute.

The FormattedName 5730870 attribute is a LONG_Name 5730874 datatype. The FormattedName 5730870 attribute has a cardinality of zero or one 5730872 meaning that for each instance of the EmployeeResponsibleParty 5730860 entity there may be one FormattedName 5730870 attribute.

The Party 5730876 package includes a Party 5730878 entity.

The Party 5730878 entity has a cardinality of zero or n 5730880 meaning that for each instance of the Party 5730818 entity there may be one or more Party 5730878 entities. The Party 5730878 entity includes various attributes, namely InternalID 5730882, RoleCode 5730888 and FormattedName 5730894.

The InternalID 5730882 attribute is a PartyInternalID 5730886 datatype. The InternalID 5730882 attribute has a cardinality of one 5730884 meaning that for each instance of the Party 5730878 entity there is one InternalID 5730882 attribute.

The RoleCode 5730888 attribute is a PartyRoleCode 5730892 datatype. The RoleCode 5730888 attribute has a cardinality of zero or one 5730890 meaning that for each instance of the Party 5730878 entity there may be one RoleCode 5730888 attribute.

The FormattedName 5730894 attribute is a LONG_Name 5730898 datatype. The FormattedName 5730894 attribute has a cardinality of zero or one 5730896 meaning that for each instance of the Party 5730878 entity there may be one FormattedName 5730894 attribute.

The ProductInformation 5730900 package includes a ProductInformation 5730902 entity. The ProductInformation 5730900 package includes a Material 5730906 package.

The ProductInformation 5730902 entity has a cardinality of zero or one 5730904 meaning that for each instance of the QualityIssueNotification 573008 entity there may be one ProductInformation 5730902 entity.

The Material 5730906 package includes a Material 5730908 entity.

The Material 5730908 entity has a cardinality of zero or one 5730910 meaning that for each instance of the ProductInformation 5730902 entity there may be one Material 5730908 entity. The Material 5730908 entity includes various attributes, namely InternalID 5730912, Description 5730918, PlantID 5730924, ProductComment 5730930, BuyerID 5730936, SellerID 5730942, ManufacturerID 5730948, BatchID 5730954 and SerialID 5730960.

The InternalID 5730912 attribute is a ProductInternalID 5730916 datatype. The InternalID 5730912 attribute has a cardinality of one 5730914 meaning that for each instance of the Material 5730908 entity there is one InternalID 5730912 attribute.

The Description 5730918 attribute is a SHORT_Description 5730922 datatype. The Description 5730918 attribute has a cardinality of zero or one 5730920 meaning that for each instance of the Material 5730908 entity there may be one Description 5730918 attribute.

The PlantID 5730924 attribute is a PlantID 5730928 datatype. The PlantID 5730924 attribute has a cardinality of zero or one 5730926 meaning that for each instance of the Material 5730908 entity there may be one PlantID 5730924 attribute.

The ProductComment 5730930 attribute is a LANGUAGEINDEPENDENT_Comment 5730934 datatype. The ProductComment 5730930 attribute has a cardinality of zero or one 5730932 meaning that for each instance of the Material 5730908 entity there may be one ProductComment 5730930 attribute.

The BuyerID 5730936 attribute is a ProductPartyID 5730940 datatype. The BuyerID 5730936 attribute has a cardinality of zero or one 5730938 meaning that for each instance of the Material 5730908 entity there may be one BuyerID 5730936 attribute.

The SellerID 5730942 attribute is a ProductPartyID 5730946 datatype. The SellerID 5730942 attribute has a cardinality of zero or one 5730944 meaning that for each instance of the Material 5730908 entity there may be one SellerID 5730942 attribute.

The ManufacturerID 5730948 attribute is a ProductPartyID 5730952 datatype. The ManufacturerID 5730948 attribute has a cardinality of zero or one 5730950 meaning that for each instance of the Material 5730908 entity there may be one ManufacturerID 5730948 attribute.

The BatchID 5730954 attribute is a BatchID 5730958 datatype. The BatchID 5730954 attribute has a cardinality of zero or one 5730956 meaning that for each instance of the Material 5730908 entity there may be one BatchID 5730954 attribute.

The SerialID 5730960 attribute is a SerialID 5730964 datatype. The SerialID 5730960 attribute has a cardinality of zero or one 5730962 meaning that for each instance of the Material 5730908 entity there may be one SerialID 5730960 attribute.

The SalesOrderInformation 5730966 package includes a SalesOrderInformation 5730968 entity. The SalesOrderInformation 5730966 package includes a SalesOrderInformation 5730972 package.

The SalesOrderInformation 5730968 entity has a cardinality of zero or one 5730970 meaning that for each instance of the QualityIssueNotification 573008 entity there may be one SalesOrderInformation 5730968 entity.

The SalesOrderInformation 5730972 package includes a SalesOrderInformation 5730974 entity.

The SalesOrderInformation 5730974 entity has a cardinality of zero or one 5730976 meaning that for each instance of the SalesOrderInformation 5730968 entity there may be one SalesOrderInformation 5730974 entity. The SalesOrderInformation 5730974 entity includes various attributes, namely ID 5730978, ItemID 5730984, BuyerID 5730990 and BuyerPurchaseDate 5730996.

The ID 5730978 attribute is a SalesOrderID 5730982 datatype. The ID 5730978 attribute has a cardinality of one 5730980 meaning that for each instance of the SalesOrderInformation 5730974 entity there is one ID 5730978 attribute.

The ItemID 5730984 attribute is a SalesOrderItemID 5730988 datatype. The ItemID 5730984 attribute has a cardinality of zero or one 5730986 meaning that for each instance of the SalesOrderInformation 5730974 entity there may be one ItemID 5730984 attribute.

The BuyerID 5730990 attribute is a BusinessTransactionDocumentID 5730994 datatype. The BuyerID 5730990 attribute has a cardinality of zero or one 5730992 meaning that for each instance of the SalesOrderInformation 5730974 entity there may be one BuyerID 5730990 attribute.

The BuyerPurchaseDate 5730996 attribute is a Date 57301000 datatype. The BuyerPurchaseDate 5730996 attribute has a cardinality of zero or one 5730998 meaning that for each instance of the SalesOrderInformation 5730974 entity there may be one BuyerPurchaseDate 5730996 attribute.

The BusinessTransactionDocumentReference 57301002 package includes a BusinessTransactionDocumentReference 57301004 entity. The BusinessTransactionDocumentReference 57301002 package includes various packages, namely OutboundDeliveryReference 57301008, PurchaseOrderReference 57301026, GoodsMovementReference 57301044, ProductionOrderReference 57301068, MaterialInspectionReference 57301080 and QualityIssueNotificationReference 57301092.

The BusinessTransactionDocumentReference 57301004 entity has a cardinality of zero or one 57301006 meaning that for each instance of the QualityIssueNotification 573008 entity there may be one BusinessTransactionDocumentReference 57301004 entity.

The OutboundDeliveryReference 57301008 package includes an OutboundDeliveryReference 57301010 entity.

The OutboundDeliveryReference 57301010 entity has a cardinality of zero or one 57301012 meaning that for each instance of the BusinessTransactionDocumentReference 57301004 entity there may be one OutboundDeliveryReference 57301010 entity. The OutboundDeliveryReference 57301010 entity includes various attributes, namely ID 57301014 and ItemID 57301020.

The ID 57301014 attribute is a DeliveryID 57301018 datatype. The ID 57301014 attribute has a cardinality of one 57301016 meaning that for each instance of the OutboundDeliveryReference 57301010 entity there is one ID 57301014 attribute.

The ItemID 57301020 attribute is a DeliveryItemID 57301024 datatype. The ItemID 57301020 attribute has a cardinality of zero or one 57301022 meaning that for each instance of the OutboundDeliveryReference 57301010 entity there may be one ItemID 57301020 attribute.

The PurchaseOrderReference 57301026 package includes a PurchaseOrderReference 57301028 entity.

The PurchaseOrderReference 57301028 entity has a cardinality of zero or one 57301030 meaning that for each instance of the BusinessTransactionDocumentReference 57301004 entity there may be one PurchaseOrderReference 57301028 entity. The PurchaseOrderReference 57301028 entity includes various attributes, namely ID 57301032 and ItemID 57301038.

The ID 57301032 attribute is a PurchaseOrderID 57301036 datatype. The ID 57301032 attribute has a cardinality of one 57301034 meaning that for each instance of the PurchaseOrderReference 57301028 entity there is one ID 57301032 attribute.

The ItemID 57301038 attribute is a PurchaseOrderItemID 57301042 datatype. The ItemID 57301038 attribute has a cardinality of zero or one 57301040 meaning that for each instance of the PurchaseOrderReference 57301028 entity there may be one ItemID 57301038 attribute.

The GoodsMovementReference 57301044 package includes a GoodsMovementReference 57301046 entity.

The GoodsMovementReference 57301046 entity has a cardinality of zero or one 57301048 meaning that for each instance of the BusinessTransactionDocumentReference 57301004 entity there may be one GoodsMovementReference 57301046 entity. The GoodsMovementReference 57301046 entity includes various attributes, namely ID 57301050, ItemID 57301056 and Year 57301062.

The ID 57301050 attribute is a GoodsMovementID 57301054 datatype. The ID 57301050 attribute has a cardinality of one 57301052 meaning that for each instance of the GoodsMovementReference 57301046 entity there is one ID 57301050 attribute.

The ItemID 57301056 attribute is a GoodsMovementItemID 57301060 datatype. The ItemID 57301056 attribute has a cardinality of zero or one 57301058 meaning that for each instance of the GoodsMovementReference 57301046 entity there may be one ItemID 57301056 attribute.

The Year 57301062 attribute is a Year 57301066 datatype. The Year 57301062 attribute has a cardinality of zero or one 57301064 meaning that for each instance of the GoodsMovementReference 57301046 entity there may be one Year 57301062 attribute.

The ProductionOrderReference 57301068 package includes a ProductionOrderReference 57301070 entity.

The ProductionOrderReference 57301070 entity has a cardinality of zero or one 57301072 meaning that for each instance of the BusinessTransactionDocumentReference 57301004 entity there may be one ProductionOrderReference 57301070 entity. The ProductionOrderReference 57301070 entity includes an ID 57301074 attribute.

The ID 57301074 attribute is a ProductionOrderID 57301078 datatype. The ID 57301074 attribute has a cardinality of one 57301076 meaning that for each instance of the ProductionOrderReference 57301070 entity there is one ID 57301074 attribute.

The MaterialInspectionReference 57301080 package includes a MaterialInspectionReference 57301082 entity.

The MaterialInspectionReference 57301082 entity has a cardinality of zero or n 57301084 meaning that for each instance of the BusinessTransactionDocumentReference 57301004 entity there may be one or more MaterialInspectionReference 57301082 entities. The MaterialInspectionReference 57301082 entity includes an ID 57301086 attribute.

The ID 57301086 attribute is a MaterialInspectionID 57301090 datatype. The ID 57301086 attribute has a cardinality of one 57301088 meaning that for each instance of the MaterialInspectionReference 57301082 entity there is one ID 57301086 attribute.

The QualityIssueNotificationReference 57301092 package includes a QualityIssueNotificationReference 57301094 entity.

The QualityIssueNotificationReference 57301094 entity has a cardinality of zero or one 57301096 meaning that for each instance of the BusinessTransactionDocumentReference 57301004 entity there may be one QualityIssueNotificationReference 57301094 entity. The QualityIssueNotificationReference 57301094 entity includes an ID 57301098 attribute.

The ID 57301098 attribute is a QualityIssueNotificationID 57301102 datatype. The ID 57301098 attribute has a cardinality of one 57301100 meaning that for each instance of the QualityIssueNotificationReference 57301094 entity there is one ID 57301098 attribute.

The Log 57301104 package is a Log 57301110 datatype. The Log 57301104 package includes a Log 57301106 entity.

The Log 57301106 entity has a cardinality of one 57301108 meaning that for each instance of the QualityIssueNotificationByIDResponseMessage_sync 573002 entity there is one Log 57301106 entity.

QualityIssueNotification Package

The QualityIssueNotification package groups the QualityIssueNotification with its packages.

QualityIssueNotification

A QualityIssueNotification is a notification of nonconformance of a product. The QualityIssueNotification includes a request to take appropriate actions. QualityIssueNotifications are used to inform all involved persons about a problem or defect in a product which may also include corrective actions to be performed. QualityIssueNotifications may document all the corrective actions and carried out activities and make them available for analysis in the long term.

ID (may be optional) refers to an identifier for a quality issue notification. ExternalQualityIssueNotificationReference (may be optional) refers to an identifier for an external quality issue notification reference document. SystemAdministrativeData refers to administrative data that is stored in a system. This data includes system users and change dates/times. StatusObject describes the processing status of a quality issue notification in structured form. IssueCategoryFilterCode refers to a coded representation of the filter for issue categories in issue category catalogues. IssueQualityIssueCategoryCatalogueID (may be optional) refers to an identifier of a quality issue category catalogue of type Issue. IssueParentQualityIssueCategoryID (may be optional) refers to an identifier of a parent category of type Issue. IssueParentQualityIssueCategoryName (may be optional) refers to the name of the parent category of type Issue. IssueQualityIssueCategoryID (may be optional) refers to an identifier of a category of type Issue. IssueQualityIssueCategoryName (may be optional) refers to the name of the category of type Issue. ReporterInternalID refers to an identifier for a party which reported a quality issue notification. ReportedDateTime refers to a date and time when a quality issue notification was reported. RequestedProcessingPeriod (may be optional) refers to a period during which processing of the quality issue notification is requested. MachineryBreakdownIndicator (may be optional) indicates whether a machinery is in the state of breakdown. MachineryMalfunctionPeriod (may be optional) refers to a period during which a machinery is not usable due to malfunction. TypeCode refers to a coded representation of type of quality issue notification. TypeName (may be optional) refers to a name of quality issue notification type code. ImportanceCode (may be optional) refers to a coded representation of the importance of the quality issue notification. ImportanceName (may be optional) refers to a name of the importance code. ComplaintQuantity (may be optional) refers to a product quantity the customer complaints about. ReferenceQuantity (may be optional) denotes a quantity to which a business transaction refers. If the notification deals with an internal problem, the reference quantity may be the same as the production quantity. In the “Complaint quantity” field, you define how much of the production quantity is subject to complaint. InternalNonconformingQuantity (may be optional) refers to a quantity reported as nonconforming which is accepted as it is caused internal. ExternalNonconformingQuantity (may be optional) refers to a quantity reported as nonconforming which is not accepted as it is caused external. ReturnedQuantity (may be optional) refers to a quantity which was returned. ReturnedDate (may be optional) refers to a date on which the quantity was returned. Description (may be optional) refers to a short description of the quality issue. DetailedText (may be optional) refers to a detailed text of the quality issue. An IssueQualityIssueCategoryID may be unique in combination with an IssueParentQualityIssueCategoryID and IssueQualityIssueCategoryCatalogueID.

Item Package

The Item Package groups the item with its packages.

Item

An Item is a specific problem or defect that was found in a product. A QualityIssueNotification refers to an item but it is also possible to create a QualityIssueNotification without. Each QualityIssueNotificationItem can have multiple causes, tasks and activities associated with it.

ID (may be optional) identifies an item. SystemAdministrativeData (may be optional) refers to administrative data that is stored in a system. This data includes system users and change dates/times. MaterialInternalID (may be optional) refers to an identifier for a material. MaterialDescription (may be optional) refers to a description of a material. MaterialInspectionSampleID (may be optional) refers to a unique identifier for a material inspection sample. MaterialInspectionSubsetOperationID (may be optional) refers to an identifier of a material inspection operation. MaterialInspectionSubsetOperationDescription (may be optional) refers to a description of the material inspection operation. MaterialInspectionSubsetOperationWorkCentreID (may be optional) refers to an identifier of the work centre where the material was inspected. MaterialInspectionSubsetOperationWorkCentreDescription (may be optional) refers to a name of the work centre where the material was inspected. MaterialInspectionSubsetOperationWorkCentrePlantID (may be optional) refers to an identifier for the plant of the work centre where the material was inspected. MaterialInspectionSubsetOperationInspectionActivityID (may be optional) refers to an identifier of an material inspection activity. MaterialInspectionSubsetOperationInspectionActivityDescription (may be optional) refers to a description of the material inspection activity. DefectTypeQualityIssueCategoryCatalogueID (may be optional) refers to an identifier of a quality issue defect type category catalogue. DefectTypeParentQualityIssueCategoryID (may be optional) refers to an identifier of a defect type parent category. DefectTypeParentQualityIssueCategoryName (may be optional) refers to a name of the defect type parent category. DefectTypeQualityIssueCategoryID (may be optional) refers to an identifier of a defect type category. DefectTypeQualityIssueCategoryName (may be optional) refers to a name of the defect type category. DefectLocationQualityIssueCategoryCatalogueID (may be optional) refers to an identifier of a quality issue defect location category catalogue. DefectLocationParentQualityIssueCategoryID (may be optional) refers to an identifier of a defect location parent category. DefectLocationParentQualityIssueCategoryName (may be optional) refers to a name of the defect location parent category. DefectLocationQualityIssueCategoryID (may be optional) refers to an identifier of a defect location category. DefectLocationQualityIssueCategoryName (may be optional) refers to a name of the defect location category. DefectNumberValue (may be optional) refers to a number of defects.

DefectClassCode (may be optional) refers to the coded representation of a defect class. DefectClassName (may be optional) refers to a name of a defect class. DefectWeightingClassCode (may be optional) refers to a coded representation of a weighting of the defect with regard to the manufacture of the material, for example, relating to the required inspection effort or the follow-up effort due to defects in construction or production. DefectWeightingClassName (may be optional) refers to a name of the weighting of a defect class. SystematicIndicator (may be optional) refers to an indication whether the finding occurs systematically. A systematically occurring finding is one that can be traced back to a cause that is constant and stays the same. InternalNonconformingQuantity (may be optional) refers to a quantity reported as nonconforming which is accepted as it is caused internal. ExternalNonconformingQuantity (may be optional) refers to a quantity reported as nonconforming which is not accepted as it is cause external. Description (may be optional) refers to a description for an item. DetailedText (may be optional) refers to detailed text for an item. OrdinalNumberValue (may be optional) identifies the position of an item in a sorted list.

An item may either have a DefectTypeQualityIssueCategoryID or a description. A DefectTypeQualityIssueCategoryID may be unique in combination with a DefectTypeParentQualityIssueCategoryID and DefectTypeQualityIssueCategoryCatalogueID. A DefectLocationQualityIssueCategoryID may be unique in combination with a DefectLocationParentQualityIssueCategoryID and DefectLocationQualityIssueCategoryCatalogueID.

Cause Package

A Cause package groups Cause information required for a QualityIssueNotificationItem.

Cause

A Cause is a reason that led to the occurrence of the specific problem or defect found in a product. QualityIssueNotificationCauseID identifies a cause. SystemAdministrativeData refers to administrative data that is stored in a system. This data includes system users and change dates/times. QualityIssueCategoryCatalogueID (may be optional) refers to an identifier of a quality issue category catalogue of type Cause. ParentQualityIssueCategoryID (may be optional) refers to an identifier of a parent category of type Cause. ParentQualityIssueCategoryName (may be optional) refers to a name of the parent category of type Cause. QualityIssueCategoryID (may be optional) refers to an identifier of a category of type Cause. QualityIssueCategoryName (may be optional) refers to a name of the category of type Cause. Description (may be optional) refers to a description for a cause. DetailedText (may be optional) refers to a detailed text for a cause. OrdinalNumberValue (may be optional) identifies the position of a cause in a sorted list. A cause may either have a QualityIssueCategoryID or a description. A QualityIssueCategoryID may be unique in combination with a ParentQualityIssueCategoryID and QualityIssueCategoryCatalogueID.

Task Package

A Task package groups Task information required for a QualityIssueNotificationItem.

Task

A Task is a long-term action which is required to rectify the specific problem or defect found in a product. Using tasks, one can plan how different people can interact to process a QualityIssueNotification and track how various activities are completed within a specified period of time. Mainly tasks contain brief instruction describing what is to be done, responsible person, planned start and end dates for the task, and task status. Tasks for the QualityIssueNotificationItem are also referred to as "corrective tasks." These tasks usually provide final solutions that will prevent a specific problem from recurring.

QualityIssueNotificationTaskID identifies a task. SystemAdministrativeData refers to administrative data that is stored in a system. This data includes system users and change dates/times. StatusObject refers to a StatusObject describes the processing status of a quality issue notification item task in structured form. PlannedProcessingPeriod (may be optional) refers to a period during which a task is planned. EmployeeResponsibleInternalID (may be optional) refers to an EmployeeResponsibleInternalID is a proprietary identifier for an EmployeeResponsible who is responsible for processing a task. EmployeeResponsibleInternalTypeCode (may be optional) refers to an EmployeeResponsibleInternalTypeCode is the coded representation of an object type which either exists as a business partner or as an organizational centre. EmployeeResponsibleFormattedName (may be optional) refers to a word or combination of words used to name or define the complete, formatted name of a party which is responsible for the processing of a task. CompleterInternalID (may be optional) refers to an identifier of the party which completed a task. CompleterInternalName (may be optional) refers to a name of the party which completed a task. CompletionDateTime (may be optional) refers to a date and Time when a task was completed. QualityIssueCategoryCatalogueID (may be optional) refers to an identifier of a quality issue category catalogue of type Task. ParentQualityIssueCategoryID (may be optional) refers to an identifier of a parent category of type Task. ParentQualityIssueCategoryName (may be optional) refers to a name of the parent category of type Task. QualityIssueCategoryID (may be optional) refers to an identifier of a category of type Task. QualityIssueCategoryName (may be optional) refers to a name of the category of type Task. Description (may be optional) refers to a description for a task. DetailedText (may be optional) refers to a detailed text for a task. OrdinalNumberValue (may be optional) identifies the position of a task in a sorted list. A task may either have a QualityIssueCategoryID or a description. A QualityIssueCategoryID may be unique in combination with a ParentQualityIssueCategoryID and QualityIssueCategoryCatalogueID.

Activity Package

An Activity package groups Activity information required for a QualityIssueNotificationItem.

Activity

An Activity is a short-term action that shall be executed immediately to rectify the specific problem or defect found in a product. Activities for the QualityIssueNotificationItem document what has been performed concerning an item with its specific problem or defect.

QualityIssueNotificationActivityID identifies an activity. SystemAdministrativeData refers to administrative data that is stored in a system. This data includes system users and change dates/times. ProcessingPeriod (may be optional) refers to a period during which an activity is carried out. QualityIssueCategoryCatalogueID (may be optional) refers to an identifier of a quality issue category catalogue of type Activity. ParentQualityIssueCategoryID (may be optional) refers to an identifier of a parent category of type Activity. ParentQualityIssueCategoryName (may be optional) refers to a name of the parent category of type Activity. QualityIssueCategoryID (may be optional) refers to an identifier of a category of type Activity. QualityIssueCategoryName (may be optional) refers to a name of the category of type Activity. Description (may be optional) refers to a description for an activity. DetailedText (may be optional) refers to a detailed text for an activity. OrdinalNumberValue (may be optional) identifies the position of an activity in a sorted list. An activity may either have a QualityIssueCategoryID or a description. A QualityIssueCategoryID may be unique in combination with a ParentQualityIssueCategoryID and QualityIssueCategoryCatalogueID.

Task Package

A Task package groups Task information required for a QualityIssueNotification.

Task

A Task is a long-term action which is required to rectify all problems or defects found in a product. Using tasks, one can plan how different people can interact to process a QualityIssueNotification and track how various activities are completed within a specified period of time. Usually tasks contain brief instruction describing what is to be done, responsible person, planned start and end dates for the task, and task status. Tasks for the QualityIssueNotification are also referred to as "immediate tasks." These tasks usually provide a "quick fix" for the complete issue requiring immediate attention.

ID identifies a task. SystemAdministrativeData refers to administrative data that is stored in a system. This data includes system users and change dates/times. StatusObject refers to a StatusObject describes the processing status of a quality issue notification task in structured form. PlannedProcessingPeriod (may be optional) refers to a period during which a task is planned. EmployeeResponsibleInternalID (may be optional) refers to an EmployeeResponsibleInternalID is a proprietary identifier for an EmployeeResponsible who is responsible for processing a task. EmployeeResponsibleInternalTypeCode (may be optional) refers to an EmployeeResponsibleInternalTypeCode is the coded representation of an object type which either exists as a business partner or as an organizational centre. EmployeeResponsibleFormattedName (may be optional) refers to a word or combination of words used to name or define the complete, formatted name of a party which is responsible for the processing of a task. CompleterInternalID (may be optional) refers to an identifier of the party which completed a task. CompleterInternalName (may be optional) refers to a name of the party which completed a task. CompletionDateTime (may be optional) refers to a date and Time when a task was completed. QualityIssueCategoryCatalogueID (may be optional) refers to an identifier of a quality issue category catalogue of type Task. ParentQualityIssueCategoryID (may be optional) refers to an identifier of a parent category of type Task. ParentQualityIssueCategoryName (may be optional) refers to a name of the parent category of type Task. QualityIssueCategoryID (may be optional) refers to an identifier of a category of type Task. QualityIssueCategoryName (may be optional) refers to a name of the category of type Task. Description (may be optional) refers to a description for a task. DetailedText (may be optional) refers to a detailed text for a task. OrdinalNumberValue (may be optional) identifies the position of a task in a sorted list. A task may either have a QualityIssueCategoryID or a description. A QualityIssueCategoryID may be unique in combination with a ParentQualityIssueCategoryID and QualityIssueCategoryCatalogueID.

Activity Package

An Activity package groups Activity information required for a QualityIssueNotification.

Activity

An Activity is a short-term action that shall be executed immediately to rectify all problems or defects found in a product. Activities for the QualityIssueNotification document what has been performed concerning the complete issue.

ID identifies an activity. SystemAdministrativeData refers to administrative data that is stored in a system. This data includes system users and change dates/times. ProcessingPeriod (may be optional) refers to a period during which an activity is carried out. QualityIssueCategoryCatalogueID (may be optional) refers to an identifier of a quality issue category catalogue of type Activity. ParentQualityIssueCategoryID (may be optional) refers to an identifier of a parent category of type Activity. ParentQualityIssueCategoryName (may be optional) refers to a name of the parent category of type Activity. QualityIssueCategoryID (may be optional) refers to an identifier of a category of type Activity. QualityIssueCategoryName (may be optional) refers to a name of the category of type Activity. Description (may be optional) refers to a description for an activity. DetailedText (may be optional) refers to a detailed text for an activity. OrdinalNumberValue (may be optional) identifies the position of an activity in a sorted list. An activity may either have a QualityIssueCategoryID or a description. A QualityIssueCategoryID may be unique in combination with a ParentQualityIssueCategoryID and QualityIssueCategoryCatalogueID.

Party Package

A Party package groups together all the business parties involved in the QualityIssueNotification.

BuyerParty

A BuyerParty is a business partner to whom materials or services are offered or provided. InternalID refers to an identifier for a party. FormattedName (may be optional) refers to a complete, formatted name of a party.

VendorParty

A VendorParty is a business partner who offers or provides materials or services. InternalID refers to an identifier for a party. FormattedName (may be optional) refers to a complete, formatted name of a party.

EmployeeResponsibleParty

An EmployeeResponsibleParty is a party that is responsible for the completion of a QualityIssueNotification. InternalID refers to an identifier for a party. FormattedName (may be optional) refers to a complete, formatted name of a party.

Party

A Party is a natural person, organization, or group that is somehow related to a QualityIssueNotification. Further parties may be added here. InternalID refers to an identifier for a party. RoleCode (may be optional) refers to a coded representation of a PartyRole. FormattedName (may be optional) refers to a complete, formatted name of a party.

ProductInformation Package

The ProductInformation package groups material information of a QualityIssueNotification.

Material

A material is a specific good where in case of quality issue notification defects resulting from poor-quality have been found. A material may have either a batch or a serialized number. A Batch is a homogenous amount of a single material having uniform quality and properties and is generally produced during a single production process. A SerialNumber is a number which can be assigned to a physical material. The SerialNumber is used to distinguish a specific material from all the other materials with the same material-ID. The combination SerialNumber and material-ID can be unique.

InternalID refers to an identifier for a material. Description (may be optional) refers to a description of a material. PlantID (may be optional) refers to an identifier for the plant of a material. ProductComment (may be optional) refers to a generic language independent comment for product. Length limited to 40 characters. BuyerID (may be optional) refers to an identifier for a material assigned by a customer. SellerID (may be optional) refers to an identifier for a material assigned by a supplier. ManufacturerID (may be optional) refers to an identifier for a material assigned by a manufacturer. BatchID (may be optional) refers to an identifier for a batch of a material. SerialID (may be optional) refers to an identifier for an individual item of a material.

SalesOrderInformation Package

The SalesOrderInformation package groups sales order information of a QualityIssueNotification.

SalesOrderInformation

A SalesOrderInformation is an agreement between a seller and a customer regarding the sale and delivery of goods associated with this at a certain time, for a certain quantity and at a certain price. ID refers to an identifier of a SalesOrder a QualityIssueNotification is referring to. ItemID (may be optional) refers to an identifier for an item in a SalesOrder a QualityIssueNotification is referring to. BuyerID (may be optional) refers to an identifier for a sales order assigned by a customer. BuyerPurchaseDate (may be optional) refers to a date at which a sales order is acquired by purchasing.

BusinessTransactionDocumentReference Package

The BusinessTransactionDocumentReference package contains references to other BusinessTransactionDocuments that are related to a QualityIssueNotification.

OutboundDeliveryReference

OutboundDeliveryReference is a composition of goods that is provided for shipping by a vendor. ID refers to an identifier for a OutboundDelivery a QualityIssueNotification is referring to. ItemID (may be optional) refers to an identifier for a OutboundDeliveryItem a QualityIssueNotification is referring to.

PurchaseOrderReference

A PurchaseOrderReference is a buyer's request to a seller to provide or deliver certain quantities of products at one or several dates. ID refers to an identifier specified by the buyer for a PurchaseOrder a QualityIssueNotification is referring to. ItemID (may be optional) refers to an identifier specified by the buyer for the PurchaseOrderItem a QualityIssueNotification is referring to.

GoodsMovementReference

A GoodsMovementReference references a GoodsMovement. GoodsMovement is a transaction resulting in a change in inventory. ID refers to an identifier for a GoodsMovement a QualityIssueNotification is referring to. ItemID (may be optional) refers to an identifier for a GoodsMovement item a QualityIssueNotification is referring to. Year (may be optional) refers to a year in which the GoodsMovement was created.

ProductionOrderReference

ProductionOrderReference references a ProductionOrder. ProductionOrder is an order to produce a certain amount of one or more materials in a certain time frame. ID refers to an identifier for a Production Order a QualityIssueNotification is referring to.

MaterialInspectionReference

A MaterialInspectionReference is the execution of an inspection for a particular material, and is used to record this inspection. ID refers to an identifier for a material inspection a QualityIssueNotification is referring to.

QualityIssueNotificationReference

A QualityIssueNotificationReference is the reference to a previous quality issue notification. ID refers to an identifier for a QualityIssueNotification.

Message Data Type

The message data type QualityIssueNotificationChangeRequestMessage_sync contains the business information that is relevant for sending a business document in a message and the QualityIssueNotification included in the business document. FIGS. 575-1 through 575-27 show a QualityIssueNotificationChangeRequestMessage_sync 575000 package. The QualityIssueNotificationChangeRequestMessage_sync 575000 package is a QualityIssueNotificationChangeRequestMessage_sync 575004 datatype. The QualityIssueNotificationChangeRequestMessage_sync 575000 package includes a QualityIssueNotificationChangeRequestMessage_sync 575002 entity. The QualityIssueNotificationChangeRequestMessage_sync 575000 package includes various packages, namely MessageHeader 575006 and QualityIssueNotification 575014.

The MessageHeader 575006 package is a BasicBusinessDocumentMessageHeader 575012 datatype. The MessageHeader 575006 package includes a MessageHeader 575008 entity.

The MessageHeader 575008 entity has a cardinality of zero or one 575010 meaning that for each instance of the QualityIssueNotificationChangeRequestMessage_sync 575002 entity there may be one MessageHeader 575008 entity.

The QualityIssueNotification 575014 package includes a QualityIssueNotification 575016 entity. The QualityIssueNotification 575014 package includes various packages, namely Item 5750140, Task 5750452, Activity 5750536, Party 5750596, ProductInformation 5750656, SalesOrderInformation 5750716 and BusinessTransactionDocumentReference 5750752.

The QualityIssueNotification 575016 entity has a cardinality of one 575018 meaning that for each instance of the QualityIssueNotificationChangeRequestMessage_sync 575002 entity there is one QualityIssueNotification 575016 entity. The QualityIssueNotification 575016 entity includes various attributes, namely ID 575020, ExternalQualityIssueNotificationReference 575026, IssueQualityIssueCategoryCatalogueID 575032, IssueParentQualityIssueCategoryID 575038, IssueQualityIssueCategoryID 575044, ReporterInternalID 575050, ReportedDateTime 575056, RequestedProcessingPeriod 575062, MachineryBreakdownIndicator 575068, MachineryMalfunctionPeriod 575074, TypeCode 575080, ImportanceCode 575086, ComplaintQuantity 575092, ReferenceQuantity 575098, InternalNonconformingQuantity 5750104, ExternalNonconformingQuantity 5750110, ReturnedQuantity 5750116, ReturnedDate 5750122, Description 5750128 and DetailedText 5750134.

The ID 575020 attribute is a QualityIssueNotificationID 575024 datatype. The ID 575020 attribute has a cardinality of one 575022 meaning that for each instance of the QualityIssueNotification 575016 entity there is one ID 575020 attribute.

The ExternalQualityIssueNotificationReference 575026 attribute is a BusinessTransactionDocumentReference 575030 datatype. The ExternalQualityIssueNotificationReference 575026 attribute has a cardinality of zero or one 575028 meaning that for each instance of the QualityIssueNotification 575016 entity there may be one ExternalQualityIssueNotificationReference 575026 attribute.

The IssueQualityIssueCategoryCatalogueID 575032 attribute is a QualityIssueCategoryCatalogueID 575036 datatype. The IssueQualityIssueCategoryCatalogueID 575032 attribute has a cardinality of zero or one 575034 meaning that for each instance of the QualityIssueNotification 575016 entity there may be one IssueQualityIssueCategoryCatalogueID 575032 attribute.

The IssueParentQualityIssueCategoryID 575038 attribute is a QualityIssueCategoryID 575042 datatype. The IssueParentQualityIssueCategoryID 575038 attribute has a cardinality of zero or one 575040 meaning that for each instance of the QualityIssueNotification 575016 entity there may be one IssueParentQualityIssueCategoryID 575038 attribute.

The IssueQualityIssueCategoryID 575044 attribute is a QualityIssueCategoryID 575048 datatype. The IssueQualityIssueCategoryID 575044 attribute has a cardinality of zero or one 575046 meaning that for each instance of the QualityIssueNotification 575016 entity there may be one IssueQualityIssueCategoryID 575044 attribute.

The ReporterInternalID 575050 attribute is a PartyInternalID 575054 datatype. The ReporterInternalID 575050 attribute has a cardinality of zero or one 575052 meaning that for each instance of the QualityIssueNotification 575016 entity there may be one ReporterInternalID 575050 attribute.

The ReportedDateTime 575056 attribute is a TIMEZONEINDEPENDENT_DateTime 575060 datatype. The ReportedDateTime 575056 attribute has a cardinality of zero or one 575058 meaning that for each instance of the QualityIssueNotification 575016 entity there may be one ReportedDateTime 575056 attribute.

The RequestedProcessingPeriod 575062 attribute is an UPPEROPEN_TIMEZONEINDEPENDENT_ DateTimePeriod 575066 datatype. The RequestedProcessingPeriod 575062 attribute has a cardinality of zero or one 575064 meaning that for each instance of the QualityIssueNotification 575016 entity there may be one RequestedProcessingPeriod 575062 attribute.

The MachineryBreakdownIndicator 575068 attribute is an Indicator 575072 datatype. The MachineryBreakdownIndicator 575068 attribute has a cardinality of zero or one 575070 meaning that for each instance of the QualityIssueNotification 575016 entity there may be one MachineryBreakdownIndicator 575068 attribute.

The MachineryMalfunctionPeriod 575074 attribute is an UPPEROPEN_TIMEZONEINDEPENDENT_ DateTimePeriod 575078 datatype. The MachineryMalfunctionPeriod 575074 attribute has a cardinality of zero or one 575076 meaning that for each instance of the QualityIssueNotification 575016 entity there may be one MachineryMalfunctionPeriod 575074 attribute.

The TypeCode 575080 attribute is a QualityIssueNotificationTypeCode 575084 datatype. The TypeCode 575080 attribute has a cardinality of one 575082 meaning that for each instance of the QualityIssueNotification 575016 entity there is one TypeCode 575080 attribute.

The ImportanceCode 575086 attribute is an ImportanceCode 575090 datatype. The ImportanceCode 575086 attribute has a cardinality of zero or one 575088 meaning that for each instance of the QualityIssueNotification 575016 entity there may be one ImportanceCode 575086 attribute.

The ComplaintQuantity 575092 attribute is a Quantity 575096 datatype. The ComplaintQuantity 575092 attribute has a cardinality of zero or one 575094 meaning that for each instance of the QualityIssueNotification 575016 entity there may be one ComplaintQuantity 575092 attribute.

The ReferenceQuantity 575098 attribute is a Quantity 5750102 datatype. The ReferenceQuantity 575098 attribute has a cardinality of zero or one 5750100 meaning that for each instance of the QualityIssueNotification 575016 entity there may be one ReferenceQuantity 575098 attribute.

The InternalNonconformingQuantity 5750104 attribute is a Quantity 5750108 datatype. The InternalNonconformingQuantity 5750104 attribute has a cardinality of zero or one 5750106 meaning that for each instance of the QualityIssueNotification 575016 entity there may be one InternalNonconformingQuantity 5750104 attribute.

The ExternalNonconformingQuantity 5750110 attribute is a Quantity 5750114 datatype. The ExternalNonconformingQuantity 5750110 attribute has a cardinality of zero or one 5750112 meaning that for each instance of the QualityIssueNotification 575016 entity there may be one ExternalNonconformingQuantity 5750110 attribute.

The ReturnedQuantity 5750116 attribute is a Quantity 5750120 datatype. The ReturnedQuantity 5750116 attribute has a cardinality of zero or one 5750118 meaning that for each instance of the QualityIssueNotification 575016 entity there may be one ReturnedQuantity 5750116 attribute.

The ReturnedDate 5750122 attribute is a Date 5750126 datatype. The ReturnedDate 5750122 attribute has a cardinality of zero or one 5750124 meaning that for each instance of the QualityIssueNotification 575016 entity there may be one ReturnedDate 5750122 attribute.

The Description 5750128 attribute is a SHORT_Description 5750132 datatype. The Description 5750128 attribute has a cardinality of zero or one 5750130 meaning that for each instance of the QualityIssueNotification 575016 entity there may be one Description 5750128 attribute.

The DetailedText 5750134 attribute is a Text 5750138 datatype. The DetailedText 5750134 attribute has a cardinality of zero or one 5750136 meaning that for each instance of the QualityIssueNotification 575016 entity there may be one DetailedText 5750134 attribute.

The Item 5750140 package includes an Item 5750142 entity. The Item 5750140 package includes various packages, namely Cause 5750254, Task 5750308 and Activity 5750392.

The Item 5750142 entity has a cardinality of zero or n 5750144 meaning that for each instance of the QualityIssueNotification 575016 entity there may be one or more Item 5750142 entities. The Item 5750142 entity includes various attributes, namely ID 5750146, MaterialInternalID 5750152, MaterialInspectionSampleID 5750158, DefectTypeQualityIssueCategoryCatalogueID 5750164, DefectTypeParentQualityIssueCategoryID 5750170, DefectTypeQualityIssueCategoryID 5750176, DefectLocationQualityIssueCategoryCatalogueID 5750182, DefectLocationParentQualityIssueCategoryID 5750188, DefectLocationQualityIssueCategoryID 5750194, DefectNumberValue 5750200, DefectClassCode 5750206, DefectWeightingClassCode 5750212, InternalNonconformingQuantity 5750218, ExternalNonconformingQuantity 5750224, Description 5750230, DetailedText 5750236, OrdinalNumberValue 5750242 and @actionCode 5750248.

The ID 5750146 attribute is a QualityIssueNotificationItemID 5750150 datatype. The ID 5750146 attribute has a cardinality of one 5750148 meaning that for each instance of the Item 5750142 entity there is one ID 5750146 attribute.

The MaterialInternalID 5750152 attribute is a ProductInternalID 5750156 datatype. The MaterialInternalID 5750152 attribute has a cardinality of zero or one 5750154 meaning that for each instance of the Item 5750142 entity there may be one MaterialInternalID 5750152 attribute.

The MaterialInspectionSampleID 5750158 attribute is a MaterialInspectionSampleID 5750162 datatype. The MaterialInspectionSampleID 5750158 attribute has a cardinality of zero or one 5750160 meaning that for each instance of the Item 5750142 entity there may be one MaterialInspectionSampleID 5750158 attribute.

The DefectTypeQualityIssueCategoryCatalogueID 5750164 attribute is a QualityIssueCategoryCatalogueID 5750168 datatype. The DefectTypeQualityIssueCategoryCatalogueID 5750164 attribute has a cardinality of zero or one 5750166 meaning that for each instance of the Item 5750142 entity there may be one DefectTypeQualityIssueCategoryCatalogueID 5750164 attribute.

The DefectTypeParentQualityIssueCategoryID 5750170 attribute is a QualityIssueCategoryID 5750174 datatype. The DefectTypeParentQualityIssueCategoryID 5750170 attribute has a cardinality of zero or one 5750172 meaning that for each instance of the Item 5750142 entity there may be one DefectTypeParentQualityIssueCategoryID 5750170 attribute.

The DefectTypeQualityIssueCategoryID 5750176 attribute is a QualityIssueCategoryID 5750180 datatype. The DefectTypeQualityIssueCategoryID 5750176 attribute has a cardinality of zero or one 5750178 meaning that for each instance of the Item 5750142 entity there may be one DefectTypeQualityIssueCategoryID 5750176 attribute.

The DefectLocationQualityIssueCategoryCatalogueID 5750182 attribute is a QualityIssueCategoryCatalogueID 5750186 datatype. The DefectLocationQualityIssueCategoryCatalogueID 5750182 attribute has a cardinality of zero or one 5750184 meaning that for each instance of the Item 5750142 entity there may be one DefectLocationQualityIssueCategoryCatalogueID 5750182 attribute.

The DefectLocationParentQualityIssueCategoryID 5750188 attribute is a QualityIssueCategoryID 5750192 datatype. The DefectLocationParentQualityIssueCategoryID 5750188 attribute has a cardinality of zero or one 5750190 meaning that for each instance of the Item 5750142 entity there may be one DefectLocationParentQualityIssueCategoryID 5750188 attribute.

The DefectLocationQualityIssueCategoryID 5750194 attribute is a QualityIssueCategoryID 5750198 datatype. The DefectLocationQualityIssueCategoryID 5750194 attribute has a cardinality of zero or one 5750196 meaning that for each instance of the Item 5750142 entity there may be one DefectLocationQualityIssueCategoryID 5750194 attribute.

The DefectNumberValue 5750200 attribute is a NumberValue 5750204 datatype. The DefectNumberValue 5750200 attribute has a cardinality of zero or one 5750202 meaning that for each instance of the Item 5750142 entity there may be one DefectNumberValue 5750200 attribute.

The DefectClassCode 5750206 attribute is a DefectClassCode 5750210 datatype. The DefectClassCode 5750206 attribute has a cardinality of zero or one 5750208 meaning that for each instance of the Item 5750142 entity there may be one DefectClassCode 5750206 attribute.

The DefectWeightingClassCode 5750212 attribute is a DefectWeightingClassCode 5750216 datatype. The DefectWeightingClassCode 5750212 attribute has a cardinality of zero or one 5750214 meaning that for each instance of the Item 5750142 entity there may be one DefectWeightingClassCode 5750212 attribute.

The InternalNonconformingQuantity 5750218 attribute is a Quantity 5750222 datatype. The InternalNonconformingQuantity 5750218 attribute has a cardinality of zero or one 5750220 meaning that for each instance of the Item 5750142 entity there may be one InternalNonconformingQuantity 5750218 attribute.

The ExternalNonconformingQuantity 5750224 attribute is a Quantity 5750228 datatype. The ExternalNonconformingQuantity 5750224 attribute has a cardinality of zero or one 5750226 meaning that for each instance of the Item 5750142 entity there may be one ExternalNonconformingQuantity 5750224 attribute.

The Description 5750230 attribute is a SHORT_Description 5750234 datatype. The Description 5750230 attribute has a cardinality of zero or one 5750232 meaning that for each instance of the Item 5750142 entity there may be one Description 5750230 attribute.

The DetailedText 5750236 attribute is a Text 5750240 datatype. The DetailedText 5750236 attribute has a cardinality of zero or one 5750238 meaning that for each instance of the Item 5750142 entity there may be one DetailedText 5750236 attribute.

The OrdinalNumberValue 5750242 attribute is an OrdinalNumberValue 5750246 datatype. The OrdinalNumberValue 5750242 attribute has a cardinality of zero or one 5750244 meaning that for each instance of the Item 5750142 entity there may be one OrdinalNumberValue 5750242 attribute.

The @actionCode 5750248 attribute is an ActionCode 5750252 datatype. The @actionCode 5750248 attribute has a cardinality of zero or one 5750250 meaning that for each instance of the Item 5750142 entity there may be one @actionCode 5750248 attribute.

The Cause 5750254 package includes a Cause 5750256 entity.

The Cause 5750256 entity has a cardinality of zero or n 5750258 meaning that for each instance of the Item 5750142 entity there may be one or more Cause 5750256 entities. The Cause 5750256 entity includes various attributes, namely QualityIssueNotificationCauseID 5750260, QualityIssueCategoryCatalogueID 5750266, ParentQualityIssueCategoryID 5750272, QualityIssueCategoryID 5750278, Description 5750284, DetailedText 5750290, OrdinalNumberValue 5750296 and @actionCode 5750302.

The QualityIssueNotificationCauseID 5750260 attribute is a QualityIssueNotificationCauseID 5750264 datatype. The QualityIssueNotificationCauseID 5750260 attribute has a cardinality of one 5750262 meaning that for each instance of the Cause 5750256 entity there is one QualityIssueNotificationCauseID 5750260 attribute.

The QualityIssueCategoryCatalogueID 5750266 attribute is a QualityIssueCategoryCatalogueID 5750270 datatype. The QualityIssueCategoryCatalogueID 5750266 attribute has a cardinality of zero or one 5750268 meaning that for each instance of the Cause 5750256 entity there may be one QualityIssueCategoryCatalogueID 5750266 attribute.

The ParentQualityIssueCategoryID 5750272 attribute is a QualityIssueCategoryID 5750276 datatype. The ParentQualityIssueCategoryID 5750272 attribute has a cardinality of zero or one 5750274 meaning that for each instance of the Cause 5750256 entity there may be one ParentQualityIssueCategoryID 5750272 attribute.

The QualityIssueCategoryID 5750278 attribute is a QualityIssueCategoryID 5750282 datatype. The QualityIssueCategoryID 5750278 attribute has a cardinality of zero or one 5750280 meaning that for each instance of the Cause 5750256 entity there may be one QualityIssueCategoryID 5750278 attribute.

The Description 5750284 attribute is a SHORT_Description 5750288 datatype. The Description 5750284 attribute has a cardinality of zero or one 5750286 meaning that for each instance of the Cause 5750256 entity there may be one Description 5750284 attribute.

The DetailedText 5750290 attribute is a Text 5750294 datatype. The DetailedText 5750290 attribute has a cardinality of zero or one 5750292 meaning that for each instance of the Cause 5750256 entity there may be one DetailedText 5750290 attribute.

The OrdinalNumberValue 5750296 attribute is an OrdinalNumberValue 5750300 datatype. The OrdinalNumberValue 5750296 attribute has a cardinality of zero or one 5750298 meaning that for each instance of the Cause 5750256 entity there may be one OrdinalNumberValue 5750296 attribute.

The @actionCode 5750302 attribute is an ActionCode 5750306 datatype. The @actionCode 5750302 attribute has a cardinality of zero or one 5750304 meaning that for each instance of the Cause 5750256 entity there may be one @actionCode 5750302 attribute.

The Task 5750308 package includes a Task 5750310 entity.

The Task 5750310 entity has a cardinality of zero or n 5750312 meaning that for each instance of the Item 5750142 entity there may be one or more Task 5750310 entities. The Task 5750310 entity includes various attributes, namely QualityIssueNotificationTaskID 5750314, QualityIssueCategoryCatalogueID 5750320, ParentQualityIssueCategoryID 5750326, QualityIssueCategoryID 5750332, PlannedProcessingPeriod 5750338, EmployeeResponsibleInternalID 5750344, EmployeeResponsibleInternalTypeCode 5750350, CompleterInternalID 5750356, CompletionDateTime 5750362, Description 5750368, DetailedText 5750374, OrdinalNumberValue 5750380 and @actionCode 5750386.

The QualityIssueNotificationTaskID 5750314 attribute is a QualityIssueNotificationTaskID 5750318 datatype. The QualityIssueNotificationTaskID 5750314 attribute has a cardinality of one 5750316 meaning that for each instance of the Task 5750310 entity there is one QualityIssueNotificationTaskID 5750314 attribute.

The QualityIssueCategoryCatalogueID 5750320 attribute is a QualityIssueCategoryCatalogueID 5750324 datatype. The QualityIssueCategoryCatalogueID 5750320 attribute has a cardinality of zero or one 5750322 meaning that for each instance of the Task 5750310 entity there may be one QualityIssueCategoryCatalogueID 5750320 attribute.

The ParentQualityIssueCategoryID 5750326 attribute is a QualityIssueCategoryID 5750330 datatype. The ParentQualityIssueCategoryID 5750326 attribute has a cardinality of zero or one 5750328 meaning that for each instance of the Task 5750310 entity there may be one ParentQualityIssueCategoryID 5750326 attribute.

The QualityIssueCategoryID 5750332 attribute is a QualityIssueCategoryID 5750336 datatype. The QualityIssueCategoryID 5750332 attribute has a cardinality of zero or one 5750334 meaning that for each instance of the Task 5750310 entity there may be one QualityIssueCategoryID 5750332 attribute.

The PlannedProcessingPeriod 5750338 attribute is an UPPEROPEN_TIMEZONEINDEPENDENT_ DateTimePeriod 5750342 datatype. The PlannedProcessingPeriod 5750338 attribute has a cardinality of zero or one 5750340 meaning that for each instance of the Task 5750310 entity there may be one PlannedProcessingPeriod 5750338 attribute.

The EmployeeResponsibleInternalID 5750344 attribute is a PartyInternalID 5750348 datatype. The EmployeeResponsibleInternalID 5750344 attribute has a cardinality of zero or one 5750346 meaning that for each instance of the Task 5750310 entity there may be one EmployeeResponsibleInternalID 5750344 attribute.

The EmployeeResponsibleInternalTypeCode 5750350 attribute is a BusinessObjectTypeCode 5750354 datatype. The EmployeeResponsibleInternalTypeCode 5750350 attribute has a cardinality of zero or one 5750352 meaning that for each instance of the Task 5750310 entity there may be one EmployeeResponsibleInternalTypeCode 5750350 attribute.

The CompleterInternalID 5750356 attribute is a PartyInternalID 5750360 datatype. The CompleterInternalID 5750356 attribute has a cardinality of zero or one 5750358 meaning that for each instance of the Task 5750310 entity there may be one CompleterInternalID 5750356 attribute.

The CompletionDateTime 5750362 attribute is a TIMEZONEINDEPENDENT_DateTime 5750366 datatype. The CompletionDateTime 5750362 attribute has a cardinality of zero or one 5750364 meaning that for each instance of the Task 5750310 entity there may be one CompletionDateTime 5750362 attribute.

The Description 5750368 attribute is a SHORT_Description 5750372 datatype. The Description 5750368 attribute has a cardinality of zero or one 5750370 meaning that for each instance of the Task 5750310 entity there may be one Description 5750368 attribute.

The DetailedText 5750374 attribute is a Text 5750378 datatype. The DetailedText 5750374 attribute has a cardinality of zero or one 5750376 meaning that for each instance of the Task 5750310 entity there may be one DetailedText 5750374 attribute.

The OrdinalNumberValue 5750380 attribute is an OrdinalNumberValue 5750384 datatype. The OrdinalNumberValue 5750380 attribute has a cardinality of zero or one 5750382 meaning that for each instance of the Task 5750310 entity there may be one OrdinalNumberValue 5750380 attribute.

The @actionCode 5750386 attribute is an ActionCode 5750390 datatype. The @actionCode 5750386 attribute has a cardinality of zero or one 5750388 meaning that for each instance of the Task 5750310 entity there may be one @actionCode 5750386 attribute.

The Activity 5750392 package includes an Activity 5750394 entity.

The Activity 5750394 entity has a cardinality of zero or n 5750396 meaning that for each instance of the Item 5750142 entity there may be one or more Activity 5750394 entities. The Activity 5750394 entity includes various attributes, namely QualityIssueNotificationActivityID 5750398, QualityIssueCategoryCatalogueID 5750404, ParentQualityIssueCategoryID 5750410, QualityIssueCategoryID 5750416, ProcessingPeriod 5750422, Description 5750428, DetailedText 5750434, OrdinalNumberValue 5750440 and @actionCode 5750446.

The QualityIssueNotificationActivityID 5750398 attribute is a QualityIssueNotificationActivityID 5750402 datatype. The QualityIssueNotificationActivityID 5750398 attribute has a cardinality of one 5750400 meaning that for each instance of the Activity 5750394 entity there is one QualityIssueNotificationActivityID 5750398 attribute.

The QualityIssueCategoryCatalogueID 5750404 attribute is a QualityIssueCategoryCatalogueID 5750408 datatype.

The QualityIssueCategoryCatalogueID 5750404 attribute has a cardinality of zero or one 5750406 meaning that for each instance of the Activity 5750394 entity there may be one QualityIssueCategoryCatalogueID 5750404 attribute.

The ParentQualityIssueCategoryID 5750410 attribute is a QualityIssueCategoryID 5750414 datatype. The ParentQualityIssueCategoryID 5750410 attribute has a cardinality of zero or one 5750412 meaning that for each instance of the Activity 5750394 entity there may be one ParentQualityIssueCategoryID 5750410 attribute.

The QualityIssueCategoryID 5750416 attribute is a QualityIssueCategoryID 5750420 datatype. The QualityIssueCategoryID 5750416 attribute has a cardinality of zero or one 5750418 meaning that for each instance of the Activity 5750394 entity there may be one QualityIssueCategoryID 5750416 attribute.

The ProcessingPeriod 5750422 attribute is an UPPEROPEN_TIMEZONEINDEPENDENT_DateTimePeriod 5750426 datatype. The ProcessingPeriod 5750422 attribute has a cardinality of zero or one 5750424 meaning that for each instance of the Activity 5750394 entity there may be one ProcessingPeriod 5750422 attribute.

The Description 5750428 attribute is a SHORT_Description 5750432 datatype. The Description 5750428 attribute has a cardinality of zero or one 5750430 meaning that for each instance of the Activity 5750394 entity there may be one Description 5750428 attribute.

The DetailedText 5750434 attribute is a Text 5750438 datatype. The DetailedText 5750434 attribute has a cardinality of zero or one 5750436 meaning that for each instance of the Activity 5750394 entity there may be one DetailedText 5750434 attribute.

The OrdinalNumberValue 5750440 attribute is an OrdinalNumberValue 5750444 datatype. The OrdinalNumberValue 5750440 attribute has a cardinality of zero or one 5750442 meaning that for each instance of the Activity 5750394 entity there may be one OrdinalNumberValue 5750440 attribute.

The @actionCode 5750446 attribute is an ActionCode 5750450 datatype. The @actionCode 5750446 attribute has a cardinality of zero or one 5750448 meaning that for each instance of the Activity 5750394 entity there may be one @actionCode 5750446 attribute.

The Task 5750452 package includes a Task 5750454 entity.

The Task 5750454 entity has a cardinality of zero or n 5750456 meaning that for each instance of the QualityIssueNotification 575016 entity there may be one or more Task 5750454 entities. The Task 5750454 entity includes various attributes, namely ID 5750458, QualityIssueCategoryCatalogueID 5750464, ParentQualityIssueCategoryID 5750470, QualityIssueCategoryID 5750476, PlannedProcessingPeriod 5750482, EmployeeResponsibleInternalID 5750488, EmployeeResponsibleInternalTypeCode 5750494, CompleterInternalID 5750500, CompletionDateTime 5750506, Description 5750512, DetailedText 5750518, OrdinalNumberValue 5750524 and @actionCode 5750530.

The ID 5750458 attribute is a QualityIssueNotificationTaskID 5756462 datatype. The ID 5750458 attribute has a cardinality of one 5750460 meaning that for each instance of the Task 5750454 entity there is one ID 5750458 attribute.

The QualityIssueCategoryCatalogueID 5750464 attribute is a QualityIssueCategoryCatalogueID 5750468 datatype. The QualityIssueCategoryCatalogueID 5750464 attribute has a cardinality of zero or one 5750466 meaning that for each instance of the Task 5750454 entity there may be one QualityIssueCategoryCatalogueID 5750464 attribute.

The ParentQualityIssueCategoryID 5750470 attribute is a QualityIssueCategoryID 5750474 datatype. The ParentQualityIssueCategoryID 5750470 attribute has a cardinality of zero or one 5750472 meaning that for each instance of the Task 5750454 entity there may be one ParentQualityIssueCategoryID 5750470 attribute.

The QualityIssueCategoryID 5750476 attribute is a QualityIssueCategoryID 5750480 datatype. The QualityIssueCategoryID 5750476 attribute has a cardinality of zero or one 5750478 meaning that for each instance of the Task 5750454 entity there may be one QualityIssueCategoryID 5750476 attribute.

The PlannedProcessingPeriod 5750482 attribute is an UPPEROPEN_TIMEZONEINDEPENDENT_ DateTimePeriod 5750486 datatype. The PlannedProcessingPeriod 5750482 attribute has a cardinality of zero or one 5750484 meaning that for each instance of the Task 5750454 entity there may be one PlannedProcessingPeriod 5750482 attribute.

The EmployeeResponsibleInternalID 5750488 attribute is a PartyInternalID 5750492 datatype. The EmployeeResponsibleInternalID 5750488 attribute has a cardinality of zero or one 5750490 meaning that for each instance of the Task 5750454 entity there may be one EmployeeResponsibleInternalID 5750488 attribute.

The EmployeeResponsibleInternalTypeCode 5750494 attribute is a BusinessObjectTypeCode 5750498 datatype. The EmployeeResponsibleInternalTypeCode 5750494 attribute has a cardinality of zero or one 5750496 meaning that for each instance of the Task 5750454 entity there may be one EmployeeResponsibleInternalTypeCode 5750494 attribute.

The CompleterInternalID 5750500 attribute is a PartyInternalID 5750504 datatype. The CompleterInternalID 5750500 attribute has a cardinality of zero or one 5750502 meaning that for each instance of the Task 5750454 entity there may be one CompleterInternalID 5750500 attribute.

The CompletionDateTime 5750506 attribute is a TIMEZONEINDEPENDENT_DateTime 5750510 datatype. The CompletionDateTime 5750506 attribute has a cardinality of zero or one 5750508 meaning that for each instance of the Task 5750454 entity there may be one CompletionDateTime 5750506 attribute.

The Description 5750512 attribute is a SHORT_Description 5750516 datatype. The Description 5750512 attribute has a cardinality of zero or one 5750514 meaning that for each instance of the Task 5750454 entity there may be one Description 5750512 attribute.

The DetailedText 5750518 attribute is a Text 5750522 datatype. The DetailedText 5750518 attribute has a cardinality of zero or one 5750520 meaning that for each instance of the Task 5750454 entity there may be one DetailedText 5750518 attribute.

The OrdinalNumberValue 5750524 attribute is an OrdinalNumberValue 5750528 datatype. The OrdinalNumberValue 5750524 attribute has a cardinality of zero or one 5750526 meaning that for each instance of the Task 5750454 entity there may be one OrdinalNumberValue 5750524 attribute.

The @actionCode 5750530 attribute is an ActionCode 5750534 datatype. The @actionCode 5750530 attribute has a cardinality of zero or one 5750532 meaning that for each instance of the Task 5750454 entity there may be one @actionCode 5750530 attribute.

The Activity 5750536 package includes an Activity 5750538 entity.

The Activity 5750538 entity has a cardinality of zero or n 5750540 meaning that for each instance of the QualityIssueNotification 575016 entity there may be one or more Activity 5750538 entities. The Activity 5750538 entity includes various attributes, namely ID 5750542, QualityIssueCategoryCatalogueID 5750548, ParentQualityIssueCategoryID 5750554, QualityIssueCategoryID 5750560, ProcessingPeriod 5750566, Description 5750572, DetailedText 5750578, OrdinalNumberValue 5750584 and @actionCode 5750590.

The ID 5750542 attribute is a QualityIssueNotificationActivityID 5750546 datatype. The ID 5750542 attribute has a cardinality of one 5750544 meaning that for each instance of the Activity 5750538 entity there is one ID 5750542 attribute.

The QualityIssueCategoryCatalogueID 5750548 attribute is a QualityIssueCategoryCatalogueID 5750552 datatype. The QualityIssueCategoryCatalogueID 5750548 attribute has a cardinality of zero or one 5750550 meaning that for each instance of the Activity 5750538 entity there may be one QualityIssueCategoryCatalogueID 5750548 attribute.

The ParentQualityIssueCategoryID 5750554 attribute is a QualityIssueCategoryID 5750558 datatype. The ParentQualityIssueCategoryID 5750554 attribute has a cardinality of zero or one 5750556 meaning that for each instance of the Activity 5750538 entity there may be one ParentQualityIssueCategoryID 5750554 attribute.

The QualityIssueCategoryID 5750560 attribute is a QualityIssueCategoryID 5750564 datatype. The QualityIssueCategoryID 5750560 attribute has a cardinality of zero or one 5750562 meaning that for each instance of the Activity 5750538 entity there may be one QualityIssueCategoryID 5750560 attribute.

The ProcessingPeriod 5750566 attribute is an UPPEROPEN_TIMEZONEINDEPENDENT_DateTimePeriod 5750570 datatype. The ProcessingPeriod 5750566 attribute has a cardinality of zero or one 5750568 meaning that for each instance of the Activity 5750538 entity there may be one ProcessingPeriod 5750566 attribute.

The Description 5750572 attribute is a SHORT_Description 5750576 datatype. The Description 5750572 attribute has a cardinality of zero or one 5750574 meaning that for each instance of the Activity 5750538 entity there may be one Description 5750572 attribute.

The DetailedText 5750578 attribute is a Text 5750582 datatype. The DetailedText 5750578 attribute has a cardinality of zero or one 5750580 meaning that for each instance of the Activity 5750538 entity there may be one DetailedText 5750578 attribute.

The OrdinalNumberValue 5750584 attribute is an OrdinalNumberValue 5750588 datatype. The OrdinalNumberValue 5750584 attribute has a cardinality of zero or one 5750586 meaning that for each instance of the Activity 5750538 entity there may be one OrdinalNumberValue 5750584 attribute.

The @actionCode 5750590 attribute is an ActionCode 5750594 datatype. The @actionCode 5750590 attribute has a cardinality of zero or one 5750592 meaning that for each instance of the Activity 5750538 entity there may be one @actionCode 5750590 attribute.

The Party 5750596 package includes a Party 5750598 entity. The Party 5750596 package includes various packages, namely BuyerParty 5750602, VendorParty 5750614, EmployeeResponsibleParty 5750626 and Party 5750638.

The Party 5750598 entity has a cardinality of zero or n 5750600 meaning that for each instance of the QualityIssueNotification 575016 entity there may be one or more Party 5750598 entities.

The BuyerParty 5750602 package includes a BuyerParty 5750604 entity.

The BuyerParty 5750604 entity has a cardinality of zero or n 5750606 meaning that for each instance of the Party 5750598 entity there may be one or more BuyerParty 5750604 entities. The BuyerParty 5750604 entity includes an InternalID 5750608 attribute.

The InternalID 5750608 attribute is a PartyInternalID 5750612 datatype. The InternalID 5750608 attribute has a cardinality of zero or one 5750610 meaning that for each instance of the BuyerParty 5750604 entity there may be one InternalID 5750608 attribute.

The VendorParty 5750614 package includes a VendorParty 5750616 entity.

The VendorParty 5750616 entity has a cardinality of zero or n 5750618 meaning that for each instance of the Party 5750598 entity there may be one or more VendorParty 5750616 entities. The VendorParty 5750616 entity includes an InternalID 5750620 attribute.

The InternalID 5750620 attribute is a PartyInternalID 5750624 datatype. The InternalID 5750620 attribute has a cardinality of zero or one 5750622 meaning that for each instance of the VendorParty 5750616 entity there may be one InternalID 5750620 attribute.

The EmployeeResponsibleParty 5750626 package includes an EmployeeResponsibleParty 5750628 entity.

The EmployeeResponsibleParty 5750628 entity has a cardinality of zero or n 5750630 meaning that for each instance of the Party 5750598 entity there may be one or more EmployeeResponsibleParty 5750628 entities. The EmployeeResponsibleParty 5750628 entity includes an InternalID 5750632 attribute.

The InternalID 5750632 attribute is a PartyInternalID 5750636 datatype. The InternalID 5750632 attribute has a cardinality of zero or one 5750634 meaning that for each instance of the EmployeeResponsibleParty 5750628 entity there may be one InternalID 5750632 attribute.

The Party 5750638 package includes a Party 5750640 entity.

The Party 5750640 entity has a cardinality of zero or n 5750642 meaning that for each instance of the Party 5750598 entity there may be one or more Party 5750640 entities. The Party 5750640 entity includes various attributes, namely InternalID 5750644 and RoleCode 5750650.

The InternalID 5750644 attribute is a PartyInternalID 5750648 datatype. The InternalID 5750644 attribute has a cardinality of zero or one 5750646 meaning that for each instance of the Party 5750640 entity there may be one InternalID 5750644 attribute.

The RoleCode 5750650 attribute is a PartyRoleCode 5750654 datatype. The RoleCode 5750650 attribute has a cardinality of zero or one 5750652 meaning that for each instance of the Party 5750640 entity there may be one RoleCode 5750650 attribute.

The ProductInformation 5750656 package includes a ProductInformation 5750658 entity. The ProductInformation 5750656 package includes a Material 5750662 package.

The ProductInformation 5750658 entity has a cardinality of zero or one 5750660 meaning that for each instance of the QualityIssueNotification 575016 entity there may be one ProductInformation 5750658 entity.

The Material 5750662 package includes a Material 5750664 entity.

The Material 5750664 entity has a cardinality of zero or one 5750666 meaning that for each instance of the ProductInformation 5750658 entity there may be one Material 5750664 entity. The Material 5750664 entity includes various attributes, namely InternalID 5750668, PlantID 5750674, ProductComment 5750680, BuyerID 5750686, SellerID 5750692, ManufacturerID 5750698, BatchID 5750704 and SerialID 5750710.

The InternalID 5750668 attribute is a ProductInternalID 5750672 datatype. The InternalID 5750668 attribute has a cardinality of zero or one 5750670 meaning that for each instance of the Material 5750664 entity there may be one InternalID 5750668 attribute.

The PlantID 5750674 attribute is a PlantID 5750678 datatype. The PlantID 5750674 attribute has a cardinality of zero or one 5750676 meaning that for each instance of the Material 5750664 entity there may be one PlantID 5750674 attribute.

The ProductComment 5750680 attribute is a LANGUAGEINDEPENDENT_Comment 5750684 datatype. The ProductComment 5750680 attribute has a cardinality of zero or one 5750682 meaning that for each instance of the Material 5750664 entity there may be one ProductComment 5750680 attribute.

The BuyerID 5750686 attribute is a ProductPartyID 5750690 datatype. The BuyerID 5750686 attribute has a cardinality of zero or one 5750688 meaning that for each instance of the Material 5750664 entity there may be one BuyerID 5750686 attribute.

The SellerID 5750692 attribute is a ProductPartyID 5750696 datatype. The SellerID 5750692 attribute has a cardinality of zero or one 5750694 meaning that for each instance of the Material 5750664 entity there may be one SellerID 5750692 attribute.

The ManufacturerID 5750698 attribute is a ProductPartyID 5750702 datatype. The ManufacturerID 5750698 attribute has a cardinality of zero or one 5750700 meaning that for each instance of the Material 5750664 entity there may be one ManufacturerID 5750698 attribute.

The BatchID 5750704 attribute is a BatchID 5750708 datatype. The BatchID 5750704 attribute has a cardinality of zero or one 5750706 meaning that for each instance of the Material 5750664 entity there may be one BatchID 5750704 attribute.

The SerialID 5750710 attribute is a SerialID 5750714 datatype. The SerialID 5750710 attribute has a cardinality of zero or one 5750712 meaning that for each instance of the Material 5750664 entity there may be one SerialID 5750710 attribute.

The SalesOrderInformation 5750716 package includes a SalesOrderInformation 5750718 entity. The SalesOrderInformation 5750716 package includes a SalesOrderInformation 5750722 package.

The SalesOrderInformation 5750718 entity has a cardinality of zero or one 5750720 meaning that for each instance of the QualityIssueNotification 575016 entity there may be one SalesOrderInformation 5750718 entity.

The SalesOrderInformation 5750722 package includes a SalesOrderInformation 5750724 entity.

The SalesOrderInformation 5750724 entity has a cardinality of zero or one 5750726 meaning that for each instance of the SalesOrderInformation 5750718 entity there may be one SalesOrderInformation 5750724 entity. The SalesOrderInformation 5750724 entity includes various attributes, namely ID 5750728, ItemID 5750734, BuyerID 5750740 and BuyerPurchaseDate 5750746.

The ID 5750728 attribute is a SalesOrderID 5750732 datatype. The ID 5750728 attribute has a cardinality of zero or one 5750730 meaning that for each instance of the SalesOrderInformation 5750724 entity there may be one ID 5750728 attribute.

The ItemID 5750734 attribute is a SalesOrderItemID 5750738 datatype. The ItemID 5750734 attribute has a cardinality of zero or one 5750736 meaning that for each instance of the SalesOrderInformation 5750724 entity there may be one ItemID 5750734 attribute.

The BuyerID 5750740 attribute is a BusinessTransactionDocumentID 5750744 datatype. The BuyerID 5750740 attribute has a cardinality of zero or one 5750742 meaning that for each instance of the SalesOrderInformation 5750724 entity there may be one BuyerID 5750740 attribute.

The BuyerPurchaseDate 5750746 attribute is a Date 5750750 datatype. The BuyerPurchaseDate 5750746 attribute has a cardinality of zero or one 5750748 meaning that for each instance of the SalesOrderInformation 5750724 entity there may be one BuyerPurchaseDate 5750746 attribute.

The BusinessTransactionDocumentReference 5750752 package includes a BusinessTransactionDocumentReference 5750754 entity. The BusinessTransactionDocumentReference 5750752 package includes various packages, namely OutboundDeliveryReference 5750758, PurchaseOrderReference 5750776, GoodsMovementReference 5750794, ProductionOrderReference 5750818, MaterialInspectionReference 5750830 and QualityIssueNotificationReference 5750842.

The BusinessTransactionDocumentReference 5750754 entity has a cardinality of zero or one 5750756 meaning that for each instance of the QualityIssueNotification 575016 entity there may be one BusinessTransactionDocumentReference 5750754 entity.

The OutboundDeliveryReference 5750758 package includes an OutboundDeliveryReference 5750760 entity.

The OutboundDeliveryReference 5750760 entity has a cardinality of zero or one 5750762 meaning that for each instance of the BusinessTransactionDocumentReference 5750754 entity there may be one OutboundDeliveryReference 5750760 entity. The OutboundDeliveryReference 5750760 entity includes various attributes, namely ID 5750764 and ItemID 5750770.

The ID 5750764 attribute is a DeliveryID 5750768 datatype. The ID 5750764 attribute has a cardinality of zero or one 5750766 meaning that for each instance of the OutboundDeliveryReference 5750760 entity there may be one ID 5750764 attribute.

The ItemID 5750770 attribute is a DeliveryItemID 5750774 datatype. The ItemID 5750770 attribute has a cardinality of zero or one 5750772 meaning that for each instance of the OutboundDeliveryReference 5750760 entity there may be one ItemID 5750770 attribute.

The PurchaseOrderReference 5750776 package includes a PurchaseOrderReference 5750778 entity.

The PurchaseOrderReference 5750778 entity has a cardinality of zero or one 5750780 meaning that for each instance of the BusinessTransactionDocumentReference 5750754 entity there may be one PurchaseOrderReference 5750778 entity. The PurchaseOrderReference 5750778 entity includes various attributes, namely ID 5750782 and ItemID 5750788.

The ID 5750782 attribute is a PurchaseOrderID 5750786 datatype. The ID 5750782 attribute has a cardinality of zero or one 5750784 meaning that for each instance of the PurchaseOrderReference 5750778 entity there may be one ID 5750782 attribute.

The ItemID 5750788 attribute is a PurchaseOrderItemID 5750792 datatype. The ItemID 5750788 attribute has a cardinality of zero or one 5750790 meaning that for each instance of the PurchaseOrderReference 5750778 entity there may be one ItemID 5750788 attribute.

The GoodsMovementReference 5750794 package includes a GoodsMovementReference 5750796 entity.

The GoodsMovementReference 5750796 entity has a cardinality of zero or one 5750798 meaning that for each instance of the BusinessTransactionDocumentReference 5750754 entity there may be one GoodsMovementReference 5750796 entity. The GoodsMovementReference 5750796 entity includes various attributes, namely ID 5750800, ItemID 5750806 and Year 5750812.

The ID 5750800 attribute is a GoodsMovementID 5750804 datatype. The ID 5750800 attribute has a cardinality of zero or one 5750802 meaning that for each instance of the GoodsMovementReference 5750796 entity there may be one ID 5750800 attribute.

The ItemID 5750806 attribute is a GoodsMovementItemID 5750810 datatype. The ItemID 5750806 attribute has a cardinality of zero or one 5750808 meaning that for each instance of the GoodsMovementReference 5750796 entity there may be one ItemID 5750806 attribute.

The Year 5750812 attribute is a Year 5750816 datatype. The Year 5750812 attribute has a cardinality of zero or one 5750814 meaning that for each instance of the GoodsMovementReference 5750796 entity there may be one Year 5750812 attribute.

The ProductionOrderReference 5750818 package includes a ProductionOrderReference 5750820 entity.

The ProductionOrderReference 5750820 entity has a cardinality of zero or one 5750822 meaning that for each instance of the BusinessTransactionDocumentReference 5750754 entity there may be one ProductionOrderReference 5750820 entity. The ProductionOrderReference 5750820 entity includes an ID 5750824 attribute.

The ID 5750824 attribute is a ProductionOrderID 5750828 datatype. The ID 5750824 attribute has a cardinality of zero or one 5750826 meaning that for each instance of the ProductionOrderReference 5750820 entity there may be one ID 5750824 attribute.

The MaterialInspectionReference 5750830 package includes a MaterialInspectionReference 5750832 entity.

The MaterialInspectionReference 5750832 entity has a cardinality of zero or one 5750834 meaning that for each instance of the BusinessTransactionDocumentReference 5750754 entity there may be one MaterialInspectionReference 5750832 entity. The MaterialInspectionReference 5750832 entity includes an ID 5750836 attribute.

The ID 5750836 attribute is a MaterialInspectionID 5750840 datatype. The ID 5750836 attribute has a cardinality of zero or one 5750838 meaning that for each instance of the MaterialInspectionReference 5750832 entity there may be one ID 5750836 attribute.

The QualityIssueNotificationReference 5750842 package includes a QualityIssueNotificationReference 5750844 entity.

The QualityIssueNotificationReference 5750844 entity has a cardinality of zero or one 5750846 meaning that for each instance of the BusinessTransactionDocumentReference 5750754 entity there may be one QualityIssueNotificationReference 5750844 entity. The QualityIssueNotificationReference 5750844 entity includes an ID 5750848 attribute.

The ID 5750848 attribute is a QualityIssueNotificationID 5750852 datatype. The ID 5750848 attribute has a cardinality of zero or one 5750850 meaning that for each instance of the QualityIssueNotificationReference 5750844 entity there may be one ID 5750848 attribute.

MessageHeader Package

A MessageHeader package groups the business information that is relevant for sending a business document in a message.

MessageHeader

A MessageHeader groups business information from the perspective of the sending application, for example, information to identify the business document in a message.

QualityIssueNotification Package

The QualityIssueNotification package groups the QualityIssueNotification with its packages.

QualityIssueNotification

A QualityIssueNotification is a notification of nonconformance of a product. The QualityIssueNotification includes a request to take appropriate actions. QualityIssueNotifications are used to inform all involved persons about a problem or defect in a product which may also include corrective actions to be performed. QualityIssueNotifications document all the corrective actions and carried out activities completely and make them available for analysis in the long term.

ID refers to an identifier for a quality issue notification. ExternalQualityIssueNotificationReference (may be optional) refers to an identifier for an external quality issue notification reference document. IssueQualityIssueCategoryCatalogueID (may be optional) refers to an identifier of a quality issue category catalogue of type Issue. IssueParentQualityIssueCategoryID (may be optional) refers to an identifier of a parent category of type Issue. IssueQualityIssueCategoryID (may be optional) refers to an identifier of a category of type Issue. ReporterInternalID (may be optional) refers to an identifier for a ReporterParty which reported a quality issue notification. ReportedDateTime (may be optional) refers to a date and time when a quality issue notification was reported. RequestedProcessingPeriod (may be optional) refers to a period during which processing of the quality issue notification is requested. MachineryBreakdownIndicator (may be optional) indicates whether a machinery is in the state of breakdown. MachineryMalfunctionPeriod (may be optional) refers to a period during which a machinery is not usable due to malfunction. TypeCode refers to a coded representation of type of quality issue notification. ImportanceCode (may be optional) refers to a coded representation of the importance of the quality issue notification. ComplaintQuantity (may be optional) refers to a product quantity the customer complaints about. ReferenceQuantity (may be optional) denotes a quantity to which a business transaction refers. If the notification deals with an internal problem, the reference quantity is the same as the production quantity. In the "Complaint quantity" field, you define how much of the production quantity is subject to complaint. InternalNonconformingQuantity (may be optional) refers to a quantity reported as nonconforming which is accepted as it is caused internal. ExternalNonconformingQuantity (may be optional) refers to a quantity reported as nonconforming which is not accepted as it is caused external. ReturnedQuantity (may be optional) refers to a quantity which was returned. ReturnedDate (may be optional) refers to a date on which the quantity was returned. Description (may be optional) refers to a short description of the quality issue. DetailedText (may be optional) refers to a detailed text of the quality issue. An IssueQualityIssueCategoryID can be unique in combination with an IssueParentQualityIssueCategoryID and IssueQualityIssueCategoryCatalogueID.

Item Package

The Item Package groups the item with its packages.

Item

An Item is a specific problem or defect that was found in a product. A QualityIssueNotification refers to an item but it is also possible to create a QualityIssueNotification without. Each QualityIssueNotificationItem can have multiple causes, tasks and activities associated with it.

ID Identifies an item. If a new item has to be created, an internal ID will be provided. MaterialInternalID (may be optional) refers to an identifier for a material. MaterialInspectionSampleID (may be optional) refers to a unique identifier for a material inspection sample. DefectTypeQualityIssueCategoryCatalogueID (may be optional) refers to an identifier of a quality issue defect type category catalogue. DefectTypeParentQualityIssueCategoryID (may be optional) refers to an identifier of a defect type parent category. DefectTypeQualityIssueCategoryID (may be optional) refers to an identifier of a defect type category. DefectLocationQualityIssueCategoryCatalogueID (may be optional) refers to an identifier of a quality issue defect location category catalogue. DefectLocationParentQualityIssueCategoryID (may be optional) refers to an identifier of a defect location parent category. DefectLocationQualityIssueCategoryID (may be optional) refers to an identifier of a defect location category. DefectNumberValue (may be optional) refers to a number of defects. DefectClassCode (may be optional) refers to the coded representation of a defect class. DefectWeightingClassCode (may be optional) refers to a coded representation of a weighting of the defect with regard to the manufacture of the material, for example, relating to the required inspection effort or the follow-up effort due to defects in construction or production. InternalNonconformingQuantity (may be optional) refers to a quantity reported as nonconforming which is accepted as it is caused internal. ExternalNonconformingQuantity (may be optional) refers to a quantity reported as nonconforming which is not accepted as it is cause external. Description (may be optional) refers to a description for an item. DetailedText (may be optional) refers to a detailed text for an item. OrdinalNumberValue (may be optional) identifies the position of an item in a sorted list. @actionCode (may be optional) defines the action to be performed.

Either a DefectTypeQualityIssueCategoryID or a description has to be provided. A DefectTypeQualityIssueCategoryID can be unique in combination with a DefectTypeParentQualityIssueCategoryID and DefectTypeQualityIssueCategoryCatalogueID. A DefectLocationQualityIssueCategoryID can be unique in combination with a DefectLocationParentQualityIssueCategoryID and DefectLocationQualityIssueCategoryCatalogueID.

Cause Package

A Cause package groups Cause information required for a QualityIssueNotificationItem.

Cause

A Cause is a reason that led to the occurrence of the specific problem or defect found in a product. QualityIssueNotificationCauseID identifies a cause. If a new cause has to be created, an internal ID will be provided. QualityIssueCategoryCatalogueID (may be optional) refers to an identifier of a quality issue category catalogue of type Cause. ParentQualityIssueCategoryID (may be optional) refers to an identifier of a parent category of type Cause. QualityIssueCategoryID (may be optional) refers to an identifier of a category of type Cause. Description (may be optional) refers to a description for a cause. DetailedText (may be optional) refers to a detailed text for a cause. OrdinalNumberValue (may be optional) identifies the position of a cause in a sorted list. @actionCode (may be optional) defines the action to be performed. Either a QualityIssueCategoryID or a description has to be provided. A QualityIssueCategoryID can be unique in combination with a ParentQualityIssueCategoryID and QualityIssueCategoryCatalogueID.

Task Package

A Task package groups Task information required for a QualityIssueNotificationItem.

Task

A Task is a long-term action which is required to rectify the specific problem or defect found in a product. Using tasks, one can plan how different people can interact to process a QualityIssueNotification and track how various activities are completed within a specified period of time. Mainly tasks contain brief instruction describing what is to be done, responsible person, planned start and end dates for the task, and Task status. Tasks for the QualityIssueNotificationItem may also be referred to as "corrective tasks." These tasks usually provide final solutions that will prevent a specific problem from recurring.

QualityIssueNotificationTaskID identifies a task. If a new cause has to be created, an internal ID will be provided. QualityIssueCategoryCatalogueID (may be optional) refers to an identifier of a quality issue category catalogue of type Task. ParentQualityIssueCategoryID (may be optional) refers to an identifier of a parent category of type Task. QualityIssueCategoryID (may be optional) refers to an identifier of a category of type Task. PlannedProcessingPeriod (may be optional) refers to a period during which a task is planned. EmployeeResponsibleInternalID (may be optional) refers to a proprietary identifier for an EmployeeResponsible who is responsible for processing a task. EmployeeResponsibleInternalTypeCode (may be optional) refers to the coded representation of an object type which either exists as a business partner or as an organizational centre. CompleterInternalID (may be optional) refers to an identifier of the party which completed a task. CompletionDateTime (may be optional) refers to a date and Time when a task was completed. Description (may be optional) refers to a description for a task. DetailedText (may be optional) refers to a detailed text for a task. OrdinalNumberValue (may be optional) identifies the position of a task in a sorted list. @actionCode (may be optional) defines the action to be performed. Either a QualityIssueCategoryID or a description has to be provided. A QualityIssueCategoryID can be unique in combination with a ParentQualityIssueCategoryID and QualityIssueCategoryCatalogueID.

Activity Package

An Activity package groups Activity information required for a QualityIssueNotificationItem.

Activity

An Activity is a short-term action that shall be executed immediately to rectify the specific problem or defect found in a product. Activities for the QualityIssueNotificationItem document what has been performed concerning an item with its specific problem or defect.

QualityIssueNotificationActivityID identifies an activity. If a new activity has to be created, an internal ID will be provided. QualityIssueCategoryCatalogueID (may be optional) refers to an identifier of a quality issue category catalogue of type Activity. ParentQualityIssueCategoryID (may be optional) refers to an identifier of a parent category of type Activity. QualityIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue (may be optional) identifies the position of an activity in a sorted list. @actionCode (may be optional) defines the action to be performed. Either a QualityIssueCategoryID or a description has to be provided. A QualityIssueCategoryID can be unique in combination with a ParentQualityIssueCategoryID and QualityIssueCategoryCatalogueID.

Task Package

A Task package groups Task information required for a QualityIssueNotification.

Task

A Task is a long-term action which is required to rectify all problems or defects found in a product. Using tasks, one can plan how different people can interact to process a QualityIssueNotification and track how various activities are completed within a specified period of time. Usually tasks contain brief instruction describing what is to be done, responsible person, planned start and end dates for the task, and task status. Tasks for the QualityIssueNotification are also referred to as "immediate tasks." These tasks usually provide a "quick fix" for the complete issue requiring immediate attention.

ID identifies a task. If a new cause has to be created, an internal ID will be provided. QualityIssueCategoryCatalogueID (may be optional) refers to an identifier of a quality issue category catalogue of type Task. ParentQualityIssueCategoryID (may be optional) refers to an identifier of a parent category of type Task. QualityIssueCategoryID (may be optional) refers to an identifier of a category of type Task. PlannedProcessingPeriod (may be optional) refers to a period during which a task is planned. EmployeeResponsibleInternalID (may be optional) refers to a proprietary identifier for an EmployeeResponsible who is responsible for processing a task. EmployeeResponsibleInternalTypeCode (may be optional) refers to the coded representation of an object type which either exists as a business partner or as an organizational centre. CompleterInternalID (may be optional) refers to an identifier of the party which completed a task. CompletionDateTime (may be optional) refers to a date and Time when a task was completed. Description (may be optional) refers to a description for a task. DetailedText (may be optional) refers to a detailed text for a task. OrdinalNumberValue (may be optional) identifies the position of a task in a sorted list. @actionCode (may be optional) defines the action to be performed. Either a QualityIssueCategoryID or a description has to be provided. A QualityIssueCategoryID can be unique in combination with a ParentQualityIssueCategoryID and QualityIssueCategoryCatalogueID.

Activity Package

An Activity package groups Activity information required for a QualityIssueNotification.

Activity

An Activity is a short-term action that shall be executed immediately to rectify all problems or defects found in a product. Activities for the QualityIssueNotification document what has been performed concerning the complete issue.

ID identifies an activity. If a new activity has to be created, an internal ID will be provided. QualityIssueCategoryCatalogueID (may be optional) refers to an identifier of a quality issue category catalogue of type Activity. ParentQualityIssueCategoryID (may be optional) refers to an identifier of a parent category of type Activity. QualityIssueCategoryID (may be optional) refers to an identifier of a category of type Activity. ProcessingPeriod (may be optional) refers to a period during which an activity is carried out. Description (may be optional) refers to a description for an activity. DetailedText (may be optional) refers to a detailed text for an activity. OrdinalNumberValue (may be optional) identifies the position of an activity in a sorted list. @actionCode (may be optional) defines the action to be performed. Either a QualityIssueCategoryID or a description has to be provided. A QualityIssueCategoryID can be unique in combination with a ParentQualityIssueCategoryID and QualityIssueCategoryCatalogueID.

Party Package

A Party package groups together all the business parties involved in the QualityIssueNotification.

BuyerParty

A BuyerParty is a business partner to whom materials or services are offered or provided. InternalID (may be optional) refers to an identifier for a party.

VendorParty

A VendorParty is a business partner who offers or provides materials or services. InternalID (may be optional) refers to an identifier for a party.

EmployeeResponsibleParty

An EmployeeResponsibleParty is a party that is responsible for the completion of a QualityIssueNotification. InternalID (may be optional) refers to an identifier for a party.

Party

A Party is a natural person, organization, or group that is somehow related to a QualityIssueNotification. Further parties may be added here. InternalID (may be optional) refers to an identifier for a party. RoleCode (may be optional) refers to a coded representation of a PartyRole.

ProductInformation Package

The ProductInformation package groups material information of a QualityIssueNotification.

Material

A material is a specific good where in case of quality issue notification defects resulting from poor-quality have been found. A material may have either a batch or a serialized number. A Batch is a homogenous amount of a single material having uniform quality and properties and is generally produced during a single production process. A SerialNumber is a number which can be assigned to a physical material. The SerialNumber is used to distinguish a specific material from all the other materials with the same material-ID. The combination SerialNumber and material-ID can be unique.

InternalID (may be optional) refers to an identifier for a material. PlantID (may be optional) refers to an identifier for the plant of a material. ProductComment (may be optional) refers to a generic language independent comment for product. Length limited to 40 characters. BuyerID (may be optional) refers to an identifier for a material assigned by a customer. SellerID (may be optional) refers to an identifier for a material assigned by a supplier. ManufacturerID (may be optional) refers to an identifier for a material assigned by a manufacturer. BatchID (may be optional) refers to an identifier for a batch of a material. SerialID (may be optional) refers to an identifier for an individual item of a material.

SalesOrderInformation Package

The SalesOrderInformation package groups sales order information of a QualityIssueNotification.

SalesOrderInformation

A SalesOrderInformation is an agreement between a seller and a customer regarding the sale and delivery of goods associated with this at a certain time, for a certain quantity and at a certain price.

ID (may be optional) refers to an identifier of a SalesOrder a QualityIssueNotification is referring to. ItemID (may be optional) refers to an identifier for an item in a SalesOrder a QualityIssueNotification is referring to. BuyerID (may be optional) refers to an identifier for a sales order assigned by a customer. BuyerPurchaseDate (may be optional) refers to a date at which a sales order is acquired by purchasing.

BusinessTransactionDocumentReference Package

The BusinessTransactionDocumentReference package contains references to other BusinessTransactionDocuments that are related to a QualityIssueNotification.

OutboundDeliveryReference

OutboundDeliveryReference is a composition of goods that is provided for shipping by a vendor. ID (may be optional) refers to an identifier for a OutboundDelivery a QualityIssueNotification is referring to. ItemID (may be optional) refers to an identifier for a OutboundDeliveryItem a QualityIssueNotification is referring to.

PurchaseOrderReference

A PurchaseOrderReference is a buyer's request to a seller to provide or deliver certain quantities of products at one or several dates. ID (may be optional) refers to an identifier specified by the buyer for a PurchaseOrder a QualityIssueNotification is referring to. ItemID (may be optional) refers to an identifier specified by the buyer for the PurchaseOrderItem a QualityIssueNotification is referring to.

GoodsMovementReference

A GoodsMovementReference references a GoodsMovement. GoodsMovement is a transaction resulting in a change in inventory. ID (may be optional) refers to an identifier for a GoodsMovement a QualityIssueNotification is referring to. ItemID (may be optional) refers to an identifier for a GoodsMovement item a QualityIssueNotification is referring to. Year (may be optional) refers to a year in which the GoodsMovement was created.

ProductionOrderReference

ProductionOrderReference references a ProductionOrder. ProductionOrder is an order to produce a certain amount of one or more materials in a certain time frame. ID (may be optional) refers to an identifier for a Production Order a QualityIssueNotification is referring to.

MaterialInspectionReference

A MaterialInspectionReference is the execution of an inspection for a particular material, and is used to record this inspection. ID (may be optional) refers to an identifier for a material inspection a QualityIssueNotification is referring to.

QualityIssueNotificationReference

A QualityIssueNotificationReference is the reference to a previous quality issue notification. ID (may be optional) refers to an identifier for a QualityIssueNotification.

Message Data Type

The message data type QualityIssueNotificationChangeConfirmationMessage_sync contains the business information that is relevant for sending a business document in a message, the QualityIssueNotification included in the business document, and the Log. FIG. 574 shows a QualityIssueNotificationChangeConfirmationMessage_sync 574000 package. The QualityIssueNotificationChangeConfirmationMessage_sync 574000 package is a QualityIssueNotificationChangeConfirmationMessage_sync 574004 datatype. The QualityIssueNotificationChangeConfirmationMessage_sync 574000 package includes a QualityIssueNotificationChangeConfirmationMessage_sync 574002 entity. The QualityIssueNotificationChangeConfirmationMessage_sync 574000 package includes various packages, namely MessageHeader 574006, QualityIssueNotification 574014 and Log 574032.

The MessageHeader 574006 package is a BasicBusinessDocumentMessageHeader 574012 datatype. The MessageHeader 574006 package includes a MessageHeader 574008 entity.

The MessageHeader 574008 entity has a cardinality of zero or one 574010 meaning that for each instance of the QualityIssueNotificationChangeConfirmationMessage_sync 574002 entity there may be one MessageHeader 574008 entity.

The QualityIssueNotification 574014 package includes a QualityIssueNotification 574016 entity.

The QualityIssueNotification 574016 entity has a cardinality of zero or one 574018 meaning that for each instance of the QualityIssueNotificationChangeConfirmationMessage_sync 574002 entity there may be one QualityIssueNotification 574016 entity. The QualityIssueNotification 574016 entity includes various attributes, namely ID 574020 and StatusObject 574026.

The ID 574020 attribute is a QualityIssueNotificationID 574024 datatype. The ID 574020 attribute has a cardinality of one 574022 meaning that for each instance of the QualityIssueNotification 574016 entity there is one ID 574020 attribute.

The StatusObject 574026 attribute is a StatusObject 574030 datatype. The StatusObject 574026 attribute has a cardinality of one 574028 meaning that for each instance of the QualityIssueNotification 574016 entity there is one StatusObject 574026 attribute.

The Log 574032 package is a Log 574038 datatype. The Log 574032 package includes a Log 574034 entity.

The Log 574034 entity has a cardinality of one 574036 meaning that for each instance of the QualityIssueNotificationChangeConfirmationMessage_sync 574002 entity there is one Log 574034 entity.

QualityIssueNotification Package

The QualityIssueNotification package groups the QualityIssueNotification.

QualityIssueNotification

A QualityIssueNotification is a notification of nonconformance of a product. The QualityIssueNotification includes a request to take appropriate actions. ID is an identifier for a quality issue notification. StatusObject describes the processing status of a quality issue notification in structured form.

Message Data Type

The message data type QualityIssueNotificationProductByElementsQueryMessage_sync contains the Selection for the QualityIssueNotification and the Processing Conditions. FIGS. 578-1 through 578-3 show a QualityIssueNotificationProductByElementsQueryMessage_sync 578000 package. The QualityIssueNotificationProductByElementsQueryMessage_sync 578000 package is a QualityIssueNotificationProductByElementsQueryMessage_sync 578004 datatype. The QualityIssueNotificationProductByElementsQueryMessage_sync 578000 package includes a QualityIssueNotificationProductByElementsQueryMessage_sync 578002 entity. The QualityIssueNotificationProductByElementsQueryMessage__sync 578000 package includes various packages, namely Selection 578006 and ProcessingConditions 578078.

The Selection 578006 package includes a QualityIssueNotificationSimpleSelectionByElements 578008 entity.

The QualityIssueNotificationSimpleSelectionByElements 578008 entity has a cardinality of one 578010 meaning that for each instance of the QualityIssueNotificationProductByElementsQueryMessage_sync 578002 entity there is one QualityIssueNotificationSimpleSelectionByElements 578008 entity. The QualityIssueNotificationSimpleSelectionByElements 578008 entity includes various attributes, namely TypeCode 578012, RequestedProcessingPeriod 578018 and SelectionByMaterialInternalID 578024.

The TypeCode 578012 attribute is a QualityIssueNotificationTypeCode 578016 datatype. The TypeCode 578012 attribute has a cardinality of zero or one 578014 meaning that for each instance of the QualityIssueNotificationSimpleSelectionByElements 578008 entity there may be one TypeCode 578012 attribute.

The RequestedProcessingPeriod 578018 attribute is an UPPEROPEN_TIMEZONEINDEPENDENT_ DateTimePeriod 578022 datatype. The RequestedProcessingPeriod 578018 attribute has a cardinality of zero or one 578020 meaning that for each instance of the QualityIssueNotificationSimpleSelectionByElements 578008 entity there may be one RequestedProcessingPeriod 578018 attribute.

The SelectionByMaterialInternalID 578024 attribute is a SelectionByMaterialInternalID 578028 datatype. The SelectionByMaterialInternalID 578024 attribute has a cardinality of zero or n 578026 meaning that for each instance of the QualityIssueNotificationSimpleSelectionByElements 578008 entity there may be one or more SelectionByMaterialInternalID 578024 attributes.

The ProcessingConditions 578078 package includes a ProcessingConditions 578080 entity.

The ProcessingConditions 578080 entity has a cardinality of one 578082 meaning that for each instance of the QualityIssueNotificationProductByElementsQueryMessage_sync 578002 entity there is one ProcessingConditions 578080 entity. The ProcessingConditions 578080 entity includes various attributes, namely QueryHitsMaximumNumberValue 578084 and UnlimitedQueryHitsIndicator 578090.

The QueryHitsMaximumNumberValue 578084 attribute is a NumberValue 578088 datatype. The QueryHitsMaximumNumberValue 578084 attribute has a cardinality of zero or one 578086 meaning that for each instance of the ProcessingConditions 578080 entity there may be one QueryHitsMaximumNumberValue 578084 attribute.

The UnlimitedQueryHitsIndicator 578090 attribute is an Indicator 578094 datatype. The UnlimitedQueryHitsIndicator 578090 attribute has a cardinality of zero or one 578092 meaning that for each instance of the ProcessingConditions 578080 entity there may be one UnlimitedQueryHitsIndicator 578090 attribute.

Selection Package

The Selection package collects all the selection criteria for QualityIssueNotification.

QualityIssueNotificationProductSelectionByElements

QualityIssueNotificationProductSelectionByElements specifies selection criteria to select a QualityIssueNotification. TypeCode (may be optional) refers to a coded representation of type of quality issue notification. RequestedProcessingPeriod (may be optional) refers to a period during which processing of the quality issue notification is requested. SelectionByMaterialInternalID (may be optional) refers to the selection for the material for which the quality issue notification is to be read. InclusionExclusionCode (may be optional) refers to the coded representation of the inclusion or the exclusion of a set into a result set. IntervalBoundaryTypeCode is the coded representation of an interval boundary type. The codes 2, 4 and 5 are not allowed here. LowerBoundaryMaterialInternalID (may be optional) refers to the lower boundary for the identifier of the material. UpperBoundaryMaterialInternalID (may be optional) refers to the upper boundary for the identifier of the material. BuyerPartyInternalID (may be optional) refers to an identifier for a party. VendorPartyInternalID (may be optional) refers to an identifier for a party. ReleaseStatusCode refers to a coded representation of the status of the release of a quality issue notification. ClosureStatusCode refers to a representation of a closure status of a quality issue notification. When an object is closed, it can no longer participate in any business processes. Bookings or postings on the object are no longer possible. The closed object is not changeable and not open for processing follow-on documents.

ProcessingConditions Package

The ProcessingConditions package groups means for a maximum output data size.

ProcessingConditions

ProcessingConditions specifies criteria to restrict selection of processed data. QueryHitsMaximumNumberValue (may be optional) refers to a number of hits to be returned by the query. Default value will be set to '100'. UnlimitedQueryHitsIndicator (may be optional) refers to an indicator to return all available hits. When set to true, no value should be provided for QueryHitsMaximumNumberValue.

Message Data Type

The message data type QualityIssueNotificationProductByElementsResponseMessage_sync contains the QualityIssueNotification included in the business document, the Processing Conditions, and the Log. FIGS. 579-1 through 579-5 show a QualityIssueNotificationProductByElementsResponseMessage_sync 579000 package. The QualityIssueNotificationProductByElementsResponseMessage_sync 579000 package is a QualityIssueNotificationProductByElementsResponseMessage_sync 579004 datatype. The QualityIssueNotificationProductByElementsResponseMessage_sync 579000 package includes a QualityIssueNotificationProductByElementsResponseMessage_sync 579002 entity. The QualityIssueNotificationProductByElementsResponseMessage_sync 579000 package includes various packages, namely QualityIssueNotification 579006, ProcessingConditions 5790144 and Log 5790162.

The QualityIssueNotification 579006 package includes a QualityIssueNotification 579008 entity. The QualityIssueNotification 579006 package includes various packages, namely Party 579060 and ProductReference 5790120.

The QualityIssueNotification 579008 entity has a cardinality of zero or n 579010 meaning that for each instance of the QualityIssueNotificationProductByElementsResponseMessage_sync 579002 entity there may be one or more QualityIssueNotification 579008 entities. The QualityIssueNotification 579008 entity includes various attributes, namely ID 579012, StatusObject 579018, RequestedProcessingPeriod 579024, TypeCode 579030, TypeName 579036, ImportanceCode 579042, ImportanceName 579048 and Description 579054.

The ID 579012 attribute is a QualityIssueNotificationID 579016 datatype. The ID 579012 attribute has a cardinality of one 579014 meaning that for each instance of the QualityIssueNotification 579008 entity there is one ID 579012 attribute.

The StatusObject 579018 attribute is a StatusObject 579022 datatype. The StatusObject 579018 attribute has a cardinality of one 579020 meaning that for each instance of the QualityIssueNotification 579008 entity there is one StatusObject 579018 attribute.

The RequestedProcessingPeriod 579024 attribute is an UPPEROPEN_TIMEZONEINDEPENDENT_ DateTimePeriod 579028 datatype. The RequestedProcessingPeriod 579024 attribute has a cardinality of zero or one 579026 meaning that for each instance of the QualityIssueNotification 579008 entity there may be one RequestedProcessingPeriod 579024 attribute.

The TypeCode 579030 attribute is a QualityIssueNotificationTypeCode 579034 datatype. The TypeCode 579030 attribute has a cardinality of one 579032 meaning that for each instance of the QualityIssueNotification 579008 entity there is one TypeCode 579030 attribute.

The TypeName 579036 attribute is a MEDIUM_Name 579040 datatype. The TypeName 579036 attribute has a cardinality of zero or one 579038 meaning that for each instance of the QualityIssueNotification 579008 entity there may be one TypeName 579036 attribute.

The ImportanceCode 579042 attribute is an ImportanceCode 579046 datatype. The ImportanceCode 579042 attribute has a cardinality of zero or one 579044 meaning that for each instance of the QualityIssueNotification 579008 entity there may be one ImportanceCode 579042 attribute.

The ImportanceName 579048 attribute is a MEDIUM_Name 579052 datatype. The ImportanceName 579048 attribute has a cardinality of zero or one 579050 meaning that for each instance of the QualityIssueNotification 579008 entity there may be one ImportanceName 579048 attribute.

The Description 579054 attribute is a SHORT_Description 579058 datatype. The Description 579054 attribute has a cardinality of zero or one 579056 meaning that for each instance of the QualityIssueNotification 579008 entity there may be one Description 579054 attribute.

The Party 579060 package includes a Party 579062 entity. The Party 579060 package includes various packages, namely BuyerParty 579066, VendorParty 579084 and EmployeeResponsibleParty 5790102.

The Party 579062 entity has a cardinality of zero or one 579064 meaning that for each instance of the QualityIssueNotification 579008 entity there may be one Party 579062 entity.

The BuyerParty 579066 package includes a BuyerParty 579068 entity.

The BuyerParty 579068 entity has a cardinality of zero or one 579070 meaning that for each instance of the Party 579062 entity there may be one BuyerParty 579068 entity. The BuyerParty 579068 entity includes various attributes, namely InternalID 579072 and FormattedName 579078.

The InternalID 579072 attribute is a PartyInternalID 579076 datatype. The InternalID 579072 attribute has a cardinality of one 579074 meaning that for each instance of the BuyerParty 579068 entity there is one InternalID 579072 attribute.

The FormattedName 579078 attribute is a LONG_Name 579082 datatype. The FormattedName 579078 attribute has a cardinality of zero or one 579080 meaning that for each instance of the BuyerParty 579068 entity there may be one FormattedName 579078 attribute.

The VendorParty 579084 package includes a VendorParty 579086 entity.

The VendorParty 579086 entity has a cardinality of zero or one 579088 meaning that for each instance of the Party 579062 entity there may be one VendorParty 579086 entity. The VendorParty 579086 entity includes various attributes, namely InternalID 579090 and FormattedName 579096.

The InternalID 579090 attribute is a PartyInternalID 579094 datatype. The InternalID 579090 attribute has a cardinality of one 579092 meaning that for each instance of the VendorParty 579086 entity there is one InternalID 579090 attribute.

The FormattedName 579096 attribute is a LONG_Name 5790100 datatype. The FormattedName 579096 attribute has a cardinality of zero or one 579098 meaning that for each instance of the VendorParty 579086 entity there may be one FormattedName 579096 attribute.

The EmployeeResponsibleParty 5790102 package includes an EmployeeResponsibleParty 5790104 entity.

The EmployeeResponsibleParty 5790104 entity has a cardinality of zero or one 5790106 meaning that for each instance of the Party 579062 entity there may be one EmployeeResponsibleParty 5790104 entity. The EmployeeResponsibleParty 5790104 entity includes various attributes, namely InternalID 5790108 and FormattedName 5790114.

The InternalID 5790108 attribute is a PartyInternalID 5790112 datatype. The InternalID 5790108 attribute has a cardinality of one 5790110 meaning that for each instance of the EmployeeResponsibleParty 5790104 entity there is one InternalID 5790108 attribute.

The FormattedName 5790114 attribute is a LONG_Name 5790118 datatype. The FormattedName 5790114 attribute has a cardinality of zero or one 5790116 meaning that for each instance of the EmployeeResponsibleParty 5790104 entity there may be one FormattedName 5790114 attribute.

The ProductReference 5790120 package includes a ProductReference 5790122 entity. The ProductReference 5790120 package includes a Material 5790126 package.

The ProductReference 5790122 entity has a cardinality of zero or one 5790124 meaning that for each instance of the QualityIssueNotification 579008 entity there may be one ProductReference 5790122 entity.

The Material 5790126 package includes a Material 5790128 entity.

The Material 5790128 entity has a cardinality of zero or one 5790130 meaning that for each instance of the ProductReference 5790122 entity there may be one Material 5790128 entity. The Material 5790128 entity includes various attributes, namely InternalID 5790132 and Description 5790138.

The InternalID 5790132 attribute is a ProductInternalID 5790136 datatype. The InternalID 5790132 attribute has a cardinality of one 5790134 meaning that for each instance of the Material 5790128 entity there is one InternalID 5790132 attribute.

The Description 5790138 attribute is a SHORT_Description 5790142 datatype. The Description 5790138 attribute has a cardinality of zero or one 5790140 meaning that for each instance of the Material 5790128 entity there may be one Description 5790138 attribute.

The ProcessingConditions 5790144 package includes a ProcessingConditions 5790146 entity.

The ProcessingConditions 5790146 entity has a cardinality of one 5790148 meaning that for each instance of the QualityIssueNotificationProductByElementsResponseMessage_sync 579002 entity there is one ProcessingConditions 5790146 entity. The ProcessingConditions 5790146 entity includes various attributes, namely ReturnedQueryHitsNumberValue 5790150 and MoreElementsAvailableIndicator 5790156.

The ReturnedQueryHitsNumberValue 5790150 attribute is a NumberValue 5790154 datatype. The ReturnedQueryHitsNumberValue 5790150 attribute has a cardinality of zero or one 5790152 meaning that for each instance of the ProcessingConditions 5790146 entity there may be one ReturnedQueryHitsNumberValue 5790150 attribute.

The MoreElementsAvailableIndicator 5790156 attribute is an Indicator 5790160 datatype. The MoreElementsAvailableIndicator 5790156 attribute has a cardinality of zero or one 5790158 meaning that for each instance of the ProcessingConditions 5790146 entity there may be one MoreElementsAvailableIndicator 5790156 attribute.

The Log 5790162 package is a Log 5790168 datatype. The Log 5790162 package includes a Log 5790164 entity.

The Log 5790164 entity has a cardinality of one 5790166 meaning that for each instance of the QualityIssueNotificationProductByElementsResponseMessage_sync 579002 entity there is one Log 5790164 entity.

QualityIssueNotification Package

The QualityIssueNotification package groups the QualityIssueNotification with its packages.

QualityIssueNotification

A QualityIssueNotification is a notification of nonconformance of a product. The QualityIssueNotification includes a request to take appropriate actions. ID refers to an identifier for a quality issue notification. StatusObject describes the processing status of a quality issue notification in structured form. RequestedProcessingPeriod (may be optional) refers to a period during which processing of the quality issue notification is requested. TypeCode refers to a coded representation of type of quality issue notification. TypeName (may be optional) refers to a name of quality issue notification type code. ImportanceCode (may be optional) refers to a coded representation of the importance of the quality issue notification. ImportanceName (may be optional) refers to a name of the importance code. Description (may be optional) refers to a short description of the quality issue.

Party Package

A Party package groups together all the business parties involved in the QualityIssueNotification.

BuyerParty

A BuyerParty is a business partner to whom materials or services are offered or provided. InternalID refers to an identifier for a party. FormattedName (may be optional) refers to a complete, formatted name of a party.

VendorParty

A VendorParty is a business partner who offers or provides materials or services. InternalID refers to an identifier for a party. FormattedName (may be optional) refers to a complete, formatted name of a party.

EmployeeResponsibleParty

An EmployeeResponsibleParty is a party that is responsible for the completion of a QualityIssueNotification. InternalID refers to an identifier for a party. FormattedName (may be optional) refers to a complete, formatted name of a party.

ProductInformation Package

The ProductInformation package groups material information of a QualityIssueNotification.

Material

A material is a specific good where in case of quality issue notification defects resulting from poor-quality have been found. InternalID refers to an identifier for a material. Description (may be optional) refers to a description of a material.

ProcessingConditions Package

The ProcessingConditions package groups means for a maximum output data size.

ProcessingConditions

ProcessingConditions specifies criteria to restrict selection of processed data. ReturnedQueryHitsNumberValue refers to a number of hits returned by the query. MoreElementsAvailableIndicator refers to an indicator to show that there are more hits available.

RepetitiveManufacturingConfirmation Interface

A company wants its production workers to confirm their productivity at predefined reporting points. This includes the confirmation of quantities of finished goods, the confirmation of different activities, processing times, as well as the goods movements of the consumed and produced materials altogether with respect to the corresponding planned orders, sales orders, projects or production versions.

Message Choreography

The message choreographies of FIGS. 580 and 581 describe possible logical sequences of messages that can be used to realize repetitive manufacturing business scenarios.

A RepetitiveManufacturingConfirmationCreateRequest_sync is a request to Production for creating a repetitive manufacturing confirmation. The structure of the message type RepetitiveManufacturingConfirmationCreateRequest_sync is specified by the message data type RepetitiveManufacturingConfirmationCreateRequestMessage_sync.

A RepetitiveManufacturingConfirmationCreateConfirmation_sync is the confirmation to a RepetitiveManufacturingConfirmationCreateRequest. The structure of the message type RepetitiveManufacturingConfirmationCreateConfirmation_sync is specified by the message data type RepetitiveManufacturingConfirmationCreateConfirmationMessage_sync.

A RepetitiveManufacturingConfirmationCreateRequest is a request to Production for creating a repetitive manufacturing confirmation. The structure of the message type RepetitiveManufacturingConfirmationCreateRequest is specified by the message data type RepetitiveManufacturingConfirmationCreateRequestMessage.

A RepetitiveManufacturingConfirmationCreateConfirmation is the confirmation to a RepetitiveManufacturingConfirmationCreateRequest. The structure of the message type RepetitiveManufacturingConfirmationCreateConfirmation is specified by the message data type RepetitiveManufacturingConfirmationCreateConfirmationMessage.

A RepetitiveManufacturingConfirmationCancelRequest_sync is a request to Production to cancel a repetitive manufacturing confirmation. The structure of the message type RepetitiveManufacturingConfirmationCancelRequest_sync is specified by the message data type RepetitiveManufacturingConfirmationCancelRequestMessage_sync.

A RepetitiveManufacturingConfirmationCancelConfirmation_sync is the confirmation of a RepetitiveManufacturingConfirmationCancelRequest. The structure of the message type RepetitiveManufacturingConfirmationCancelConfirmation_sync is specified by the message data type RepetitiveManufacturingConfirmationCancelConfirmationMessage_sync.

For example, a "Manufacturing Execution" system 581002 can request to create a repetitive manufacturing confirmation using the RepetitiveManufacturingConfirmationCreateRequest_sync synchronous message 581006. A "Production" system 581004 can confirm the creation request using the RepetitiveManufacturingConfirmationCreateConfirmation_sync synchronous message 581008. The "Manufacturing Execution" system 581002 can request to cancel a repetitive manufacturing confirmation using the RepetitiveManufacturingConfirmationCancelRequest_sync synchronous message 581010. The "Production" system 581004 can confirm the cancellation request using the RepetitiveManufacturingConfirmationCancelConfirmation_sync synchronous message 581012. A "Manufacturing Execution" system 581014 can request to create a repetitive manufacturing confirmation using the RepetitiveManufacturingConfirmationCreateRequest asynchronous message 581018. A "Production" system 581016 can confirm the creation request using the RepetitiveManufacturingConfirmationCreateConfirmation asynchronous message 581020.

MessageDataType RepetitiveManufacturing Confirmation-CreateRequestMessage_sync

The message data type RepetitiveManufacturingConfirmationCreateRequestMessage_sync contains the RepetitiveManufacturing Confirmation information included in the business document and the business information that is relevant for sending a business document in a message. FIGS. 593-1 through 593-11 show a RepetitiveManufacturingConfirmationCreateRequestMessage_sync 593000 package. The RepetitiveManufacturingConfirmationCreateRequestMessage_sync 593000 package is a RepetitiveManufacturingConfirmationCreateRequestMessage_sync 593004 datatype. The RepetitiveManufacturingConfirmationCreateRequestMessage_sync 593000 package includes a RepetitiveManufacturingConfirmationCreateRequestMessage_sync 593002 entity. The RepetitiveManufacturingConfirmationCreateRequestMessage_sync 593000 package includes various packages, namely MessageHeader 593006 and RepetitiveManufacturingConfirmation 593014.

The MessageHeader 593006 package is a BasicBusinessDocumentMessageHeader 593012 datatype. The MessageHeader 593006 package includes a MessageHeader 593008 entity.

The MessageHeader 593008 entity has a cardinality of one 593010 meaning that for each instance of the RepetitiveManufacturingConfirmationCreateRequestMessage_sync 593002 entity there is one MessageHeader 593008 entity.

The RepetitiveManufacturingConfirmation 593014 package includes a RepetitiveManufacturingConfirmation 593016 entity. The RepetitiveManufacturingConfirmation 593014 package includes various packages, namely SerialNumberInformation 5930194 and GoodsMovementInformation 5930206.

The RepetitiveManufacturingConfirmation 593016 entity has a cardinality of one 593018 meaning that for each instance of the RepetitiveManufacturingConfirmationCreateRequestMessage_sync 593002 entity there is one RepetitiveManufacturingConfirmation 593016 entity. The RepetitiveManufacturingConfirmation 593016 entity includes various attributes, namely MaterialInternalID 593020, PlantID 593026, SupplyPlanningAreaID 593032, InventoryManagedLocationInternalID 593038, ProductionVersionID 593044, ProductionLineWorkCentreID 593050, ProductionPlanningOrderID 593056, BatchID 593062, EmployeeID 593068, CompensationComponentTypeID 593074, CompensationComponentTypeGroupID 593080, SalesOrderID 593086, SalesOrderItemID 593092, ProductionLotProjectWorkBreakdownStructureElementID 593098, ReportingPointID 5930104, PlantDataCollectionSystemConfirmationID 5930110, RepetitiveManufacturingScenarioCode 5930116, TypeCode 5930122, ScrapQuantityScopeCode 5930128, WorkQuantityScopeCode 5930134, GoodsIssueScopeCode 5930140, LogisticsDeviationReasonCode 5930146, Description 5930152, LotSizeIndependentCostsIncludedIndicator 5930158, ComponentScrapIncludeIndicator 5930164, PostingDate 5930170, CreationDate 5930176, ConfirmQuantity 5930182 and ScrapQuantity 5930188.

The MaterialInternalID 593020 attribute is a ProductInternalID 593024 datatype. The MaterialInternalID 593020 attribute has a cardinality of one 593022 meaning that for each instance of the RepetitiveManufacturingConfirmation 593016 entity there is one MaterialInternalID 593020 attribute.

The PlantID 593026 attribute is a PlantID 593030 datatype. The PlantID 593026 attribute has a cardinality of zero or one 593028 meaning that for each instance of the RepetitiveManufacturingConfirmation 593016 entity there may be one PlantID 593026 attribute.

The SupplyPlanningAreaID 593032 attribute is a SupplyPlanningAreaID 593036 datatype. The SupplyPlanningAreaID 593032 attribute has a cardinality of zero or one 593034 meaning that for each instance of the RepetitiveManufacturingConfirmation 593016 entity there may be one SupplyPlanningAreaID 593032 attribute.

The InventoryManagedLocationInternalID 593038 attribute is a LocationInternalID 593042 datatype. The InventoryManagedLocationInternalID 593038 attribute has a cardinality of one 593040 meaning that for each instance of the RepetitiveManufacturingConfirmation 593016 entity there is one InventoryManagedLocationInternalID 593038 attribute.

The ProductionVersionID 593044 attribute is a ProductionVersionID 593048 datatype. The ProductionVersionID 593044 attribute has a cardinality of zero or one 593046 meaning that for each instance of the RepetitiveManufacturingConfirmation 593016 entity there may be one ProductionVersionID 593044 attribute.

The ProductionLineWorkCentreID 593050 attribute is a WorkCentreID 593054 datatype. The ProductionLineWorkCentreID 593050 attribute has a cardinality of zero or one 593052 meaning that for each instance of the RepetitiveManufacturingConfirmation 593016 entity there may be one ProductionLineWorkCentreID 593050 attribute.

The ProductionPlanningOrderID 593056 attribute is a ProductionPlanningOrderID 593060 datatype. The ProductionPlanningOrderID 593056 attribute has a cardinality of zero or one 593058 meaning that for each instance of the RepetitiveManufacturingConfirmation 593016 entity there may be one ProductionPlanningOrderID 593056 attribute.

The BatchID 593062 attribute is a BatchID 593066 datatype. The BatchID 593062 attribute has a cardinality of zero or one 593064 meaning that for each instance of the RepetitiveManufacturingConfirmation 593016 entity there may be one BatchID 593062 attribute.

The EmployeeID 593068 attribute is an EmployeeID 593072 datatype. The EmployeeID 593068 attribute has a cardinality of zero or one 593070 meaning that for each instance of the RepetitiveManufacturingConfirmation 593016 entity there may be one EmployeeID 593068 attribute.

The CompensationComponentTypeID 593074 attribute is a CompensationComponentTypeID 593078 datatype. The CompensationComponentTypeID 593074 attribute has a cardinality of zero or one 593076 meaning that for each instance of the RepetitiveManufacturingConfirmation 593016 entity there may be one CompensationComponentTypeID 593074 attribute.

The CompensationComponentTypeGroupID 593080 attribute is a CompensationComponentTypeGroupID 593084 datatype. The CompensationComponentTypeGroupID 593080 attribute has a cardinality of zero or one 593082 meaning that for each instance of the RepetitiveManufacturingConfirmation 593016 entity there may be one CompensationComponentTypeGroupID 593080 attribute.

The SalesOrderID 593086 attribute is a SalesOrderID 593090 datatype. The SalesOrderID 593086 attribute has a cardinality of zero or one 593088 meaning that for each instance of the RepetitiveManufacturingConfirmation 593016 entity there may be one SalesOrderID 593086 attribute.

The SalesOrderItemID 593092 attribute is a SalesOrderItemID 593096 datatype. The SalesOrderItemID 593092 attribute has a cardinality of zero or one 593094 meaning that for each instance of the RepetitiveManufacturingConfirmation 593016 entity there may be one SalesOrderItemID 593092 attribute.

The ProductionLotProjectWorkBreakdownStructureElementID 593098 attribute is a ProjectWorkBreakdownStructureElementID 5930102 datatype. The ProductionLotProjectWorkBreakdownStructureElementID 593098 attribute has a cardinality of zero or one 5930100 meaning that for each instance of the RepetitiveManufacturingConfirmation 593016 entity there may be one ProductionLotProjectWorkBreakdownStructureElementID 593098 attribute.

The ReportingPointID 5930104 attribute is a ReportingPointID 5930108 datatype. The ReportingPointID 5930104 attribute has a cardinality of zero or one 5930106 meaning that for each instance of the RepetitiveManufacturingConfirmation 593016 entity there may be one ReportingPointID 5930104 attribute.

The PlantDataCollectionSystemConfirmationID 5930110 attribute is a PlantDataCollectionSystemConfirmationID 5930114 datatype. The PlantDataCollectionSystemConfirmationID 5930110 attribute has a cardinality of zero or one 5930112 meaning that for each instance of the RepetitiveManufacturingConfirmation 593016 entity there may be one PlantDataCollectionSystemConfirmationID 5930110 attribute.

The RepetitiveManufacturingScenarioCode 5930116 attribute is a RepetitiveManufacturingScenarioCode 5930120 datatype. The RepetitiveManufacturingScenarioCode 5930116 attribute has a cardinality of one 5930118 meaning that for each instance of the RepetitiveManufacturingConfirmation 593016 entity there is one RepetitiveManufacturingScenarioCode 5930116 attribute.

The TypeCode 5930122 attribute is a RepetitiveManufacturingConfirmationTypeCode 5930126 datatype. The TypeCode 5930122 attribute has a cardinality of one 5930124 meaning that for each instance of the RepetitiveManufacturingConfirmation 593016 entity there is one TypeCode 5930122 attribute.

The ScrapQuantityScopeCode 5930128 attribute is a RepetitiveManufacturingConfirmationScrapQuantityScopeCode 5930132 datatype. The ScrapQuantityScopeCode 5930128 attribute has a cardinality of zero or one 5930130 meaning that for each instance of the RepetitiveManufacturingConfirmation 593016 entity there may be one ScrapQuantityScopeCode 5930128 attribute.

The WorkQuantityScopeCode 5930134 attribute is a RepetitiveManufacturingConfirmationWorkQuantityScopeCode 5930138 datatype. The WorkQuantityScopeCode 5930134 attribute has a cardinality of zero or one 5930136 meaning that for each instance of the RepetitiveManufacturingConfirmation 593016 entity there may be one WorkQuantityScopeCode 5930134 attribute.

The GoodsIssueScopeCode 5930140 attribute is a RepetitiveManufacturingConfirmationGoodsIssueScopeCode 5930144 datatype. The GoodsIssueScopeCode 5930140 attribute has a cardinality of zero or one 5930142 meaning that for each instance of the RepetitiveManufacturingConfirmation 593016 entity there may be one GoodsIssueScopeCode 5930140 attribute.

The LogisticsDeviationReasonCode 5930146 attribute is a LogisticsDeviationReasonCode 5930150 datatype. The LogisticsDeviationReasonCode 5930146 attribute has a cardinality of zero or one 5930148 meaning that for each instance of the RepetitiveManufacturingConfirmation 593016 entity there may be one LogisticsDeviationReasonCode 5930146 attribute.

The Description 5930152 attribute is a RepetitiveManufacturingConfirmationDescription 5930156 datatype. The Description 5930152 attribute has a cardinality of zero or one 5930154 meaning that for each instance of the RepetitiveManufacturingConfirmation 593016 entity there may be one Description 5930152 attribute.

The LotSizeIndependentCostsIncludedIndicator 5930158 attribute is an Indicator 5930162 datatype. The LotSizeIndependentCostsIncludedIndicator 5930158 attribute has a cardinality of zero or one 5930160 meaning that for each instance of the RepetitiveManufacturingConfirmation 593016 entity there may be one LotSizeIndependentCostsIncludedIndicator 5930158 attribute.

The ComponentScrapIncludeIndicator 5930164 attribute is an Indicator 5930168 datatype. The ComponentScrapIncludeIndicator 5930164 attribute has a cardinality of zero or one 5930166 meaning that for each instance of the RepetitiveManufacturingConfirmation 593016 entity there may be one ComponentScrapIncludeIndicator 5930164 attribute.

The PostingDate 5930170 attribute is a Date 5930174 datatype. The PostingDate 5930170 attribute has a cardinality of one 5930172 meaning that for each instance of the RepetitiveManufacturingConfirmation 593016 entity there is one PostingDate 5930170 attribute.

The CreationDate 5930176 attribute is a Date 5930180 datatype. The CreationDate 5930176 attribute has a cardinality of one 5930178 meaning that for each instance of the RepetitiveManufacturingConfirmation 593016 entity there is one CreationDate 5930176 attribute.

The ConfirmQuantity 5930182 attribute is a Quantity 5930186 datatype. The ConfirmQuantity 5930182 attribute has a cardinality of zero or one 5930184 meaning that for each instance of the RepetitiveManufacturingConfirmation 593016 entity there may be one ConfirmQuantity 5930182 attribute.

The ScrapQuantity 5930188 attribute is a Quantity 5930192 datatype. The ScrapQuantity 5930188 attribute has a cardinality of zero or one 5930190 meaning that for each instance of the RepetitiveManufacturingConfirmation 593016 entity there may be one ScrapQuantity 5930188 attribute.

The SerialNumberInformation 5930194 package includes a SerialNumberInformation 5930196 entity.

The SerialNumberInformation 5930196 entity has a cardinality of zero or n 5930198 meaning that for each instance of the RepetitiveManufacturingConfirmation 593016 entity there may be one or more SerialNumberInformation 5930196 entities. The SerialNumberInformation 5930196 entity includes a SerialID 5930200 attribute.

The SerialID 5930200 attribute is a SerialID 5930204 datatype. The SerialID 5930200 attribute has a cardinality of one 5930202 meaning that for each instance of the SerialNumberInformation 5930196 entity there is one SerialID 5930200 attribute.

The GoodsMovementInformation 5930206 package includes a GoodsMovementInformation 5930208 entity.

The GoodsMovementInformation 5930208 entity has a cardinality of zero or n 5930210 meaning that for each instance of the RepetitiveManufacturingConfirmation 593016 entity there may be one or more GoodsMovementInformation 5930208 entities. The GoodsMovementInformation 5930208 entity includes various attributes, namely MaterialInternalID 5930212, PlantID 5930218, InventoryManagedLocationInternalID 5930224, BatchID 5930230, ConsignmentStockVendorID 5930236, ConsignmentStockCustomerID 5930242, SalesOrderID 5930248, SalesOrderItemID 5930254, ReservationID 5930260, ReservationItemID 5930266, ProjectWorkBreakdownStructureElementID 5930272, GoodsMovementTypeCode 5930278, InventoryUsabilityCode 5930284, InventorySpecialStockTypeCode 5930290, InventoryValuationTypeCode 5930296, InputQuantity 5930302, DeliveryCompleteIndicator 5930308, WithdrawnCompleteIndicator 5930314, GoodsMovementItemDescription 5930320, GoodsRecipientName 5930326, UnloadingPointName 5930332, GoodsMovementReferenceDocumentTypeCode 5930338, GoodsMovementReasonCode 5930344, BatchExpirationDate 5930350 and BatchProductionDate 5930356.

The MaterialInternalID 5930212 attribute is a ProductInternalID 5930216 datatype. The MaterialInternalID 5930212 attribute has a cardinality of one 5930214 meaning that for each instance of the GoodsMovementInformation 5930208 entity there is one MaterialInternalID 5930212 attribute.

The PlantID 5930218 attribute is a PlantID 5930222 datatype. The PlantID 5930218 attribute has a cardinality of one 5930220 meaning that for each instance of the GoodsMovementInformation 5930208 entity there is one PlantID 5930218 attribute.

The InventoryManagedLocationInternalID 5930224 attribute is a LocationInternalID 5930228 datatype. The InventoryManagedLocationInternalID 5930224 attribute has a cardinality of one 5930226 meaning that for each instance of the GoodsMovementInformation 5930208 entity there is one InventoryManagedLocationInternalID 5930224 attribute.

The BatchID 5930230 attribute is a BatchID 5930234 datatype. The BatchID 5930230 attribute has a cardinality of zero or one 5930232 meaning that for each instance of the GoodsMovementInformation 5930208 entity there may be one BatchID 5930230 attribute.

The ConsignmentStockVendorID 5930236 attribute is a PartyInternalID 5930240 datatype. The ConsignmentStockVendorID 5930236 attribute has a cardinality of zero or one 5930238 meaning that for each instance of the GoodsMovementInformation 5930208 entity there may be one ConsignmentStockVendorID 5930236 attribute.

The ConsignmentStockCustomerID 5930242 attribute is a BusinessPartnerID 5930246 datatype. The ConsignmentStockCustomerID 5930242 attribute has a cardinality of zero or one 5930244 meaning that for each instance of the GoodsMovementInformation 5930208 entity there may be one ConsignmentStockCustomerID 5930242 attribute.

The SalesOrderID 5930248 attribute is a SalesOrderID 5930252 datatype. The SalesOrderID 5930248 attribute has a cardinality of zero or one 5930250 meaning that for each instance of the GoodsMovementInformation 5930208 entity there may be one SalesOrderID 5930248 attribute.

The SalesOrderItemID 5930254 attribute is a SalesOrderItemID 5930258 datatype. The SalesOrderItemID 5930254 attribute has a cardinality of zero or one 5930256 meaning that for each instance of the GoodsMovementInformation 5930208 entity there may be one SalesOrderItemID 5930254 attribute.

The ReservationID 5930260 attribute is a ReservationID 5930264 datatype. The ReservationID 5930260 attribute has a cardinality of zero or one 5930262 meaning that for each instance of the GoodsMovementInformation 5930208 entity there may be one ReservationID 5930260 attribute.

The ReservationItemID 5930266 attribute is a ReservationItemID 5930270 datatype. The ReservationItemID 5930266 attribute has a cardinality of zero or one 5930268 meaning that for each instance of the GoodsMovementInformation 5930208 entity there may be one ReservationItemID 5930266 attribute.

The ProjectWorkBreakdownStructureElementID 5930272 attribute is a ProjectWorkBreakdownStructureElementID 5930276 datatype. The ProjectWorkBreakdownStructureElementID 5930272 attribute has a cardinality of zero or one 5930274 meaning that for each instance of the GoodsMovementInformation 5930208 entity there may be one ProjectWorkBreakdownStructureElementID 5930272 attribute.

The GoodsMovementTypeCode 5930278 attribute is a GoodsMovementTypeCode 5930282 datatype. The GoodsMovementTypeCode 5930278 attribute has a cardinality of one 5930280 meaning that for each instance of the GoodsMovementInformation 5930208 entity there is one GoodsMovementTypeCode 5930278 attribute.

The InventoryUsabilityCode 5930284 attribute is an InventoryUsabilityCode 5930288 datatype. The InventoryUsabilityCode 5930284 attribute has a cardinality of zero or one 5930286 meaning that for each instance of the GoodsMovementInformation 5930208 entity there may be one InventoryUsabilityCode 5930284 attribute.

The InventorySpecialStockTypeCode 5930290 attribute is an InventorySpecialStockTypeCode 5930294 datatype. The InventorySpecialStockTypeCode 5930290 attribute has a cardinality of zero or one 5930292 meaning that for each instance of the GoodsMovementInformation 5930208 entity there may be one InventorySpecialStockTypeCode 5930290 attribute.

The InventoryValuationTypeCode 5930296 attribute is an InventoryValuationTypeCode 5930300 datatype. The InventoryValuationTypeCode 5930296 attribute has a cardinality of zero or one 5930298 meaning that for each instance of the GoodsMovementInformation 5930208 entity there may be one InventoryValuationTypeCode 5930296 attribute.

The InputQuantity 5930302 attribute is a Quantity 5930306 datatype. The InputQuantity 5930302 attribute has a cardinality of one 5930304 meaning that for each instance of the GoodsMovementInformation 5930208 entity there is one InputQuantity 5930302 attribute.

The DeliveryCompleteIndicator 5930308 attribute is an Indicator 5930312 datatype. The DeliveryCompleteIndicator 5930308 attribute has a cardinality of zero or one 5930310 meaning that for each instance of the GoodsMovementInformation 5930208 entity there may be one DeliveryCompleteIndicator 5930308 attribute.

The WithdrawnCompleteIndicator 5930314 attribute is an Indicator 5930318 datatype. The WithdrawnCompleteIndicator 5930314 attribute has a cardinality of zero or one 5930316 meaning that for each instance of the GoodsMovementInformation 5930208 entity there may be one WithdrawnCompleteIndicator 5930314 attribute.

The GoodsMovementItemDescription 5930320 attribute is a GoodsMovementItemDescription 5930324 datatype. The GoodsMovementItemDescription 5930320 attribute has a cardinality of zero or one 5930322 meaning that for each instance of the GoodsMovementInformation 5930208 entity there may be one GoodsMovementItemDescription 5930320 attribute.

The GoodsRecipientName 5930326 attribute is a GoodsRecipientName 5930330 datatype. The GoodsRecipient- Name 5930326 attribute has a cardinality of zero or one 5930328 meaning that for each instance of the GoodsMovementInformation 5930208 entity there may be one GoodsRecipientName 5930326 attribute.

The UnloadingPointName 5930332 attribute is an UnloadingPointName 5930336 datatype. The UnloadingPointName 5930332 attribute has a cardinality of zero or one 5930334 meaning that for each instance of the GoodsMovementInformation 5930208 entity there may be one UnloadingPointName 5930332 attribute.

The GoodsMovementReferenceDocumentTypeCode 5930338 attribute is a GoodsMovementReferenceDocumentTypeCode 5930342 datatype. The GoodsMovementReferenceDocumentTypeCode 5930338 attribute has a cardinality of one 5930340 meaning that for each instance of the GoodsMovementInformation 5930208 entity there is one GoodsMovementReferenceDocumentTypeCode 5930338 attribute.

The GoodsMovementReasonCode 5930344 attribute is a GoodsMovementReasonCode 5930348 datatype. The GoodsMovementReasonCode 5930344 attribute has a cardinality of zero or one 5930346 meaning that for each instance of the GoodsMovementInformation 5930208 entity there may be one GoodsMovementReasonCode 5930344 attribute.

The BatchExpirationDate 5930350 attribute is a Date 5930354 datatype. The BatchExpirationDate 5930350 attribute has a cardinality of zero or one 5930352 meaning that for each instance of the GoodsMovementInformation 5930208 entity there may be one BatchExpirationDate 5930350 attribute.

The BatchProductionDate 5930356 attribute is a Date 5930360 datatype. The BatchProductionDate 5930356 attribute has a cardinality of zero or one 5930358 meaning that for each instance of the GoodsMovementInformation 5930208 entity there may be one BatchProductionDate 5930356 attribute.

MessageHeader Package

A MessageHeader package groups the business information that is relevant for sending a business document in a message.

MessageHeader

A MessageHeader contains the information to identify a business document in a message from the perspective of the sending application. The MessageHeader contains BasicBusinessDocumentMessageHeader. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

RepetitiveManufacturingConfirmation Package

A RepetitiveManufacturingConfirmation package groups the business information relevant for the repetitive manufacturing confirmation.

RepetitiveManufacturingConfirmation

A RepetitiveManufacturingConfirmation is the confirmation of the work process within repetitive manufacturing including the quantity of produced goods, the time consumed as well as the performed work quantities at predefined reporting points. In addition, a repetitive manufacturing confirmation can trigger goods movement postings for the consumed goods from stock to production as well as for the produced goods.

MaterialInternalID is the unique identifier of the main material to be produced during the production process. PlantID identifies the plant in which the production process to be confirmed has been executed in. SupplyPlanningAreaID specifically identifies the plant where the planning has been carried out for the main material. InventoryManagedLocationInternalID is the unique identifier of the inventory managed location in the context of the specified plant ID the produced main material. ProductionVersionID is a unique identifier of a production version assigned to the material to be produced. ProductionLineWorkCentreID identifies the production line used to perform the production process to be confirmed. ProductionPlanningOrderID is the unique identifier of a production planning order used as reference for this confirmation. BatchID is the unique identifier of a batch in the context of a material ID. EmployeeID is the unique identifier of the person who performed the production process to be confirmed. CompensationComponentTypeID identifies the compensation component type of the person who performed the production process. CompensationComponentTypeGroupID identifies the compensation component type group of the person who performed the production process. SalesOrderID is the unique identifier of a sales order which is assigned to the material to be produced. SalesOrderItemID is the unique identifier of a sales order item in the context of a sales order ID the material to be produced is assigned to. ProjectWorkBreakdownStructureElementID identifies a single structure element of a project the material to be produced is assigned to. A ReportingPointID is a unique identifier of a reporting point in a progress description. A reporting point is a point in a process description at which data is recorded that documents the progress of production. PlantDataCollectionSystemConfirmationID is the confirmation ID of a plant data collection (PDC) confirmation system where this RepetitiveManufacturingConfirmation was originally executed. A RepetitiveManufacturingScenarioCode is a coded representation of the scenario used for this repetitive manufacturing confirmation, i.e. Make-To-Order scenario, Production-By-Lot scenario, and Make-To-Stock scenario. A RepetitiveManufacturingConfirmationTypeCode is the coded representation of the type of a repetitive manufacturing confirmation. Types are e.g. Reporting Point Confirmation, Separate Activity Confirmation, and Separate Component Consumption Confirmation. A RepetitiveManufacturingConfirmationScopeCode is the coded representation of the scope of a separated scrap confirmation of repetitive manufacturing. A scope is "Confirm scrap for reporting point", "Confirm scrap up to reporting point", or "Confirm scrap after last reporting point". A RepetitiveManufacturingConfirmationWorkQuantityScopeCode is the coded representation of the scope of a separated activity confirmation of repetitive manufacturing. A scope is "confirm all activities", "confirm activities for reporting point", or "confirm activities after last reporting point". A RepetitiveManufacturingConfirmationGoodsIssueScopeCode is the coded representation of the scope of a separated goods issue confirmation of repetitive manufacturing. A scope is "backflush all goods issues", "backflush goods issues for reporting point", or "backflush goods issues after last reporting point". LogisticsDeviationReasonCode is a coded representation of reasons for a deviation of the yield quantity from the planned value. Description can be used to describe or to comment on the repetitive manufacturing confirmation. The LotSizeIndependentCostsIncludeIndicator instructs the system to post the appropriate ordering costs while posting a confirmation in repetitive manufacturing. In repetitive manufacturing ordering costs can either be setup costs or costs for materials independent of lots. The ComponentScrapIncludeIndicator instructs the system to take scrap (which is saved in the material master record or in the BOM of these components) into account when backflushing components. If this indicator is not set, the system posts the goods issues of the components without taking the scrap recorded in the material master record into account. PostingDate is the posting date of the repetitive manufacturing confirmation. The CreationDaten is the date on which the original document was issued. ConfirmQuantity is the quantity of the produced good that meets the quality requirements. ScrapQuantity is the quantity of the produced good that may never meet the quality requirements and is thus to be discarded.

MaterialInternalID can be mandatory if CategoryCode=3 (Make-To-Stock) and PlanningOrderID is initial. ProductionVersionID shall be passed on if CategoryCode=3 (Make-To-Stock) and several production versions exist for the specified MaterialInternalID in the specified PlantID/SupplyPlanningID. ProductionPlanningOrderID can be mandatory if a confirmation is to be carried out specifically for a planned order. ProductionPlanningOrderID can be mandatory if CategoryCode=1 (Make-To-Order) and SalesOrderID/SalesOrderItemID is initial. ProductionPlanningOrderID can be mandatory if CategoryCode=3 (Make-To-Stock) and MaterialInternalID is initial. ProductionPlanningOrderID can be mandatory if CategoryCode=1 (Make-To-Order) and several production planned orders exist for the specified sales order. ProductionPlanningOrderID can be mandatory if CategoryCode=2 (Production-By-Lot) and several production planned orders exist for the specified production lot. BatchID can be mandatory if the material to be produced is handled in batches. SalesOrderID can be mandatory if CategoryCode=1 (Make-To-Order) and ProductionPlanningOrderID is initial. SalesOrderItemID can be mandatory if CategoryCode=1 (Make-To-Order) and ProductionPlanningOrderID is initial. ProductionLotProjectWorkBreakdownStructureElementID can be mandatory if CategoryCode=2 (Production-By-Lot Scenario). ReportingPointID can be mandatory if CategoryCode=3 (Make-To-Stock) and TypeCode=02 (Reporting Point Confirmation). ReportingPointID can be mandatory if TypeCode=10 (Separate Activity Confirmation) and WorkQuantityScopeCode=2 (Confirm activities for reporting point) or if WorkQuantityScopeCode=3 (Confirm activities after last reporting point). ReportingPointID can be mandatory if TypeCode=11 (Separate Component Consumption Confirmation) and GoodsIssueScopeCode=2 (Backflush goods issues for reporting point) or if GoodsIssueScopeCode=3 (Backflush goods issues after last reporting point). TypeCode=12 (Separate Component Scrap Confirmation) and GoodsIssueScopeCode=2 (Backflush goods issues for reporting point) or if GoodsIssueScopeCode=3 (Backflush goods issues after last reporting point). If CategoryCode=1 (Make-To-Order) only TypeCode 01 (Final Confirmation) and TypeCode 21 (Cancellation of a Final Confirmation) is allowed. If CategoryCode=2 (Production-By-Lot) only TypeCode 01 (Final Confirmation) TypeCode 21 (Cancellation of a Final Confirmation) is allowed. If CategoryCode=3 (Make-To-Stock) all values of TypeCode are allowed. If CategoryCode=1 (Make-ToOrder) ScrapQuantityScopeCode can not be used. If CategoryCode=2 (Production-ByLot) ScrapQuantityScopeCode can not be used. ScrapQuantityScopeCode can only be used if TypeCode=02 (Reporting Point Confirmation) and ScrapQuantity is populated. If CategoryCode=1 (Make-To-Order) WorkQuantityScopeCode can not be used. If CategoryCode=2 (Production-By-Lot) WorkQuantityScopeCode can not be used. WorkQuantityScopeCode can only be used if TypeCode=10 (Separate Activity Confirmation). If CategoryCode=1 (Make-To-Order) GoodsIssueScopeCode can not be used. If CategoryCode=2 (Production-By-Lot) GoodsIssueScopeCode can not be used. GoodsIssueScopeCode can only be used if TypeCode=11 (Separate Component Consumption Confirmation) or if TypeCode=12 (Separate Component Scrap Confirmation). LogisticsDeviationReasonCode can only be entered if a scrap confirmation is carried out. ConfirmQuantity can be mandatory if a yield confirmation is carried out and ScrapQuantity is initial. ConfirmQuantity can be mandatory if TypeCode=10 (Separate Activity Confirmation), TypeCode=11 (Separate Component Consumption Confirmation), or TypeCode=12 (Separate Component Scrap Confirmation). ScrapQuantity can be mandatory if a scrap confirmation is carried out and ConfirmQuantity is initial.

GoodsMovementInformation Package

A GoodsMovementInformation package groups the relevant business information about goods movements related to repetitive manufacturing confirmation.

GoodsMovementInformation

GoodsMovementInformation contains information about the movement of stock from an inventory managed location to production (input or consumed goods) or from production to an inventory managed location (output or produced goods) finally resulting in a change in inventory.

MaterialInternalID is the unique identifier of a material consumed or produced during the production process that is to be moved to or from an inventory managed location. PlantID is the unique identifier of the plant the consumed or produced goods are or have been stored. InventoryManagedLocationInternalID is the unique identifier of the inventory managed location in the context of the specified plant ID the consumed or produced goods have been taken from or put into. BatchID is the unique identifier of a batch in the context of a material ID. If the corresponding material has a batch requirement, BatchID can be mandatory. ConsignmentStockVendorInternalID is the unique identifier of the vendor which provides the vendor consignment stock or the pipeline material. If a special stock type code representing pipeline or vendor consignment stock is chosen, ConsignmentStockVendorID can be mandatory. ConsignmentCustomerID is the unique identifier of a customer which obtains the stock. If a special stock type code representing customer consignment stock is chosen, ConsignmentStockCustomerID can be mandatory. SalesOrderID is the unique identifier of the sales order the consumed or produced good to be moved is assigned to. If a special stock type code representing sales order stock is chosen, SalesOrderID can be mandatory. SalesOrderItemID is the unique identifier of a sales order item in the context of a sales order ID the consumed or produced good to be moved is assigned to. If a special stock type code representing sales order stock is chosen, SalesOrderItemID can be mandatory. ReservationID is a unique identifier of the corresponding reservation of production planning order. ReservationItemID identifies the reservation item the goods movements of a confirmation of repetitive manufacturing is posted with reference to. ProjectWorkBreakdownStructureElementID identifies a single structure element of the project the consumed or produced good to be moved is assigned to. If a special stock type code representing project stock is chosen, ProjectWorkBreakdownStructureElement can be mandatory. GoodsMovementTypeCode is a coded representation of the type of the goods movement (e.g. goods issue for production, reversal of goods receipt, goods receipt by product). InventoryUsabilityCode specifies the usability of a goods movement into inventory, i.e. into unrestricted stock, into restricted stock or into quality stock. InventorySpecialStockTypeCode is a coded representation of the special stock the goods receipts are posted into or the goods issues are to be withdrawn from, e.g. pipeline stock, vendor consignment stock, sales order stock, project stock. InventoryValuationTypeCode is the coded representation of the valuation type that is supposed to be assigned to the produced goods to be moved. InputQuantity quantifies the amount of consumed or produced goods during execution of the production process to be confirmed. DeliveryCompleteIndicator indicates that no further goods receipts of a main product are expected. WithdrawalCompleteIndicator indicates that no further goods issues (material inputs) or goods receipts of by-products (material outputs) are expected. ItemDescription can be used to comment on the repetitive manufacturing confirmation goods movement. GoodsRecipientName is the name of the recipient of the material output. UnloadingPointName is the name of the location where the output material has to be unloaded. GoodsMovementReferenceDocumentTypeCode is a coded representation of a goods movement reference type. It is necessary to differ between goods receipts and other goods movements i.e. goods issues or goods receipts by-product. GoodsMovementReasonCode is a coded representation of a reason for a goods movement. BatchExpirationDate is the expiration date of a good handled in batches. BatchProductionDate is the date a good handled in batches has been produced. GoodsMovementInformationInventoryManagedLocationInternalID can be mandatory except SpecialStockTypeCode '4' or '5' is chosen. GoodsMovementInformationBatchID can be mandatory if a material is handled in batches. If SpecialStockTypeCode '3' or '4' is chosen GoodsMovementInformationConsignmentStockVendorInternalID can be mandatory. If SpecialStockTypeCode '5' is chosen GoodsMovementInformationConsignmentStockCustomerID can be mandatory. If SpecialStockTypeCode '1' is chosen GoodsMovementInformationSalesOrderID can be mandatory. GoodsMovementInformationSalesOrderItemID can be mandatory if GoodsMovementInformationSalesOrderID is used. GoodsMovementInformationReservationID shall be related to the corresponding product cost collector ID. GoodsMovementInformationReservationID for reservations others than in the corresponding product cost collector is not allowed. If GoodsMovementInformationReservationD is used GoodsMovementInformationReservationItemID can be mandatory. If SpecialStockTypeCode '2' is chosen GoodsMovementInformationProjectTaskWorkBreakdownStructureID can be mandatory. GoodsMovementInformationGoodsMovementTypeCode can be mandatory. If a GoodsMovementInformationReferenceDocumentTypeCode '2' (goods receipt for production order) is chosen, GoodsMovementInformationInventoryUsabilityCode becomes mandatory. If the material is split valuated GoodsMovementInformation can be mandatory. GoodsMovementInformationInputQuantity can be mandatory. If a quantity '0' (zero) is chosen, goods movement information will not be converted into goods movement (no material document will be created). GoodsMovementInformationBatchExpirationDate may only be valuated if the material is subject to batch management requirement. This may also include the valuation of GoodsMovementInformationBatchID. GoodsMovementInformationBatchProductionDate may only be valuated if the material is subject to batch management requirement. This may also include the valuation of GoodsMovementInformationBatchID.

SerialNumberInformation Package

A SerialNumberInformation package groups the relevant business information about serial numbers of the product to be confirmed.

SerialNumberInformation

SerialNumberInformation contains information about the serial numbers of the product to be confirmed. A serial number is a unique identifier for an individual item that is assigned in the context of production. SerialNumberInformation may not be used if the material to be produced does not require serial numbers. The SerialID (serial number) is a unique identifier for an individual item that is assigned in the context of production.

Message Data Type

The message data type RepetitiveManufacturingConfirmationCreateConfirmationMessage contains the Repetitive confirmation Confirmation information included in the business document and the business information that is relevant for sending a business document in a message. FIG. 591 shows a RepetitiveManufacturingConfirmationCreateConfirmationMessage_sync 591000 package. The RepetitiveManufacturingConfirmationCreateConfirmationMessage__sync 591000 package is a RepetitiveManufacturingConfirmationCreateConfirmationMessage_sync 591004 datatype. The RepetitiveManufacturingConfirmationCreateConfirmationMessage_sync 591000 package includes a RepetitiveManufacturingConfirmationCreateConfirmationMessage_sync 591002 entity. The RepetitiveManufacturingConfirmationCreateConfirmationMessage_sync 591000 package includes various packages, namely MessageHeader 591006, RepetitiveManufacturingConfirmation 591014 and Log 591026.

The MessageHeader 591006 package is a BasicBusinessDocumentMessageHeader 591012 datatype. The MessageHeader 591006 package includes a MessageHeader 591008 entity.

The RepetitiveManufacturingConfirmation 591014 package includes a RepetitiveManufacturingConfirmation 591016 entity.

The RepetitiveManufacturingConfirmation 591016 entity has a cardinality of zero or one 591018 meaning that for each instance of the RepetitiveManufacturingConfirmationCreateConfirmationMessage_sync 591002 entity there may be one RepetitiveManufacturingConfirmation 591016 entity. The RepetitiveManufacturingConfirmation 591016 entity includes an ID 591020 attribute.

The ID 591020 attribute is a RepetitiveManufacturingConfirmationID 591024 datatype. The ID 591020 attribute has a cardinality of one 591022 meaning that for each instance of the RepetitiveManufacturingConfirmation 591016 entity there is one ID 591020 attribute.

The Log 591026 package is a Log 591032 datatype. The Log 591026 package includes a Log 591028 entity.

The Log 591028 entity has a cardinality of one 591030 meaning that for each instance of the RepetitiveManufacturingConfirmationCreateConfirmationMessage_sync 591002 entity there is one Log 591028 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

RepetitiveManufacturingConfirmation Package

A RepetitiveManufacturingConfirmation package groups the business information about the repetitive manufacturing confirmation.

RepetitiveManufacturingConfirmation

RepetitiveManufacturingConfirmation contains the information about the repetitive manufacturing confirmation carried out. ID is the unique identifier of a confirmation in repetitive manufacturing.

Log Package

Log

A log is a sequence of messages that may result from the execution of an application task.

MessageDataType RepetitiveManufacturing Confirmation-CreateRequestMessage

The message data type RepetitiveManufacturingConfirmationCreateRequestMessage contains the Repetitive-Manufacturing Confirmation information included in the business document and the business information that is relevant for sending a business document in a message. FIGS. 592-1 through 592-10 show a RepetitiveManufacturingConfirmationCreateRequestMessage 592000 package. The RepetitiveManufacturingConfirmationCreateRequestMessage 592000 package is a RepetitiveManufacturingConfirmationCreateRequestMessage 592004 datatype. The RepetitiveManufacturingConfirmationCreateRequestMessage 592000 package includes a RepetitiveManufacturingConfirmationCreateRequestMessage 592002 entity. The RepetitiveManufacturingConfirmationCreateRequestMessage 592000 package includes various packages, namely MessageHeader 592006 and RepetitiveManufacturingConfirmation 592014.

The MessageHeader 592006 package is a BasicBusinessDocumentMessageHeader 592012 datatype. The MessageHeader 592006 package includes a MessageHeader 592008 entity.

The MessageHeader 592008 entity has a cardinality of one 592010 meaning that for each instance of the RepetitiveManufacturingConfirmationCreateRequestMessage 592002 entity there is one MessageHeader 592008 entity.

The RepetitiveManufacturingConfirmation 592014 package includes a RepetitiveManufacturingConfirmation 592016 entity. The RepetitiveManufacturingConfirmation 592014 package includes various packages, namely SerialNumberInformation 5920194 and GoodsMovementInformation 5920206.

The RepetitiveManufacturingConfirmation 592016 entity has a cardinality of one 592018 meaning that for each instance of the RepetitiveManufacturingConfirmationCreateRequestMessage 592002 entity there is one RepetitiveManufacturingConfirmation 592016 entity. The RepetitiveManufacturingConfirmation 592016 entity includes various attributes, namely MaterialInternalID 592020, PlantID 592026, SupplyPlanningAreaID 592032, InventoryManagedLocationID 592038, ProductionVersionID 592044, ProductionLineWorkCentreID 592050, ProductionPlanningOrderID 592056, BatchID 592062, EmployeeID 592068, CompensationComponentTypeID 592074, CompensationComponentTypeGroupID 592080, SalesOrderID 592086, SalesOrderItemID 592092, ProductionLotProjectWorkBreakdownStructureElementID 592098, ReportingPointID 5920104, PlantDataCollectionSystemConfirmationID 5920110, ScenarioCode 5920116, TypeCode 5920122, ScrapQuantityScopeCode 5920128, WorkQuantityScopeCode 5920134, GoodsIssueScopeCode 5920140, LogisticsDeviationReasonCode 5920146, Description 5920152, LotSizeIndependentCostsIncludedIndicator 5920158, ComponentScrapIncludeIndicator 5920164, PostingDate 5920170, CreationDate 5920176, ConfirmQuantity 5920182 and ScrapQuantity 5920188.

The MaterialInternalID 592020 attribute is a ProductInternalID 592024 datatype. The MaterialInternalID 592020 attribute has a cardinality of one 592022 meaning that for each instance of the RepetitiveManufacturingConfirmation 592016 entity there is one MaterialInternalID 592020 attribute.

The PlantID 592026 attribute is a PlantID 592030 datatype. The PlantID 592026 attribute has a cardinality of zero or one 592028 meaning that for each instance of the RepetitiveManufacturingConfirmation 592016 entity there may be one PlantID 592026 attribute.

The SupplyPlanningAreaID 592032 attribute is a SupplyPlanningAreaID 592036 datatype. The SupplyPlanningAreaID 592032 attribute has a cardinality of zero or one 592034 meaning that for each instance of the RepetitiveManufacturingConfirmation 592016 entity there may be one SupplyPlanningAreaID 592032 attribute.

The InventoryManagedLocationID 592038 attribute is a LocationInternalID 592042 datatype. The InventoryManagedLocationID 592038 attribute has a cardinality of one 592040 meaning that for each instance of the RepetitiveManufacturingConfirmation 592016 entity there is one InventoryManagedLocationID 592038 attribute.

The ProductionVersionID 592044 attribute is a ProductionVersionID 592048 datatype. The ProductionVersionID 592044 attribute has a cardinality of zero or one 592046 meaning that for each instance of the RepetitiveManufacturingConfirmation 592016 entity there may be one ProductionVersionID 592044 attribute.

The ProductionLineWorkCentreID 592050 attribute is a WorkCentreID 592054 datatype. The ProductionLineWorkCentreID 592050 attribute has a cardinality of zero or one 592052 meaning that for each instance of the RepetitiveManufacturingConfirmation 592016 entity there may be one ProductionLineWorkCentreID 592050 attribute.

The ProductionPlanningOrderID 592056 attribute is a ProductionPlanningOrderID 592060 datatype. The ProductionPlanningOrderID 592056 attribute has a cardinality of zero or one 592058 meaning that for each instance of the RepetitiveManufacturingConfirmation 592016 entity there may be one ProductionPlanningOrderID 592056 attribute.

The BatchID 592062 attribute is a BatchID 592066 datatype. The BatchID 592062 attribute has a cardinality of zero or one 592064 meaning that for each instance of the RepetitiveManufacturingConfirmation 592016 entity there may be one BatchID 592062 attribute.

The EmployeeID 592068 attribute is an EmployeeID 592072 datatype. The EmployeeID 592068 attribute has a cardinality of zero or one 592070 meaning that for each instance of the RepetitiveManufacturingConfirmation 592016 entity there may be one EmployeeID 592068 attribute.

The CompensationComponentTypeID 592074 attribute is a CompensationComponentTypeID 592078 datatype. The CompensationComponentTypeID 592074 attribute has a cardinality of zero or one 592076 meaning that for each instance of the RepetitiveManufacturingConfirmation 592016 entity there may be one CompensationComponentTypeID 592074 attribute.

The CompensationComponentTypeGroupID 592080 attribute is a CompensationComponentTypeGroupID 592084 datatype. The CompensationComponentTypeGroupID 592080 attribute has a cardinality of zero or one 592082 meaning that for each instance of the RepetitiveManufacturingConfirmation 592016 entity there may be one CompensationComponentTypeGroupID 592080 attribute.

The SalesOrderID 592086 attribute is a SalesOrderID 592090 datatype. The SalesOrderID 592086 attribute has a cardinality of zero or one 592088 meaning that for each instance of the RepetitiveManufacturingConfirmation 592016 entity there may be one SalesOrderID 592086 attribute.

The SalesOrderItemID 592092 attribute is a SalesOrderItemID 592096 datatype. The SalesOrderItemID 592092 attribute has a cardinality of zero or one 592094 meaning that for each instance of the RepetitiveManufacturingConfirmation 592016 entity there may be one SalesOrderItemID 592092 attribute.

The ProductionLotProjectWorkBreakdownStructureElementID 592098 attribute is a ProjectWorkBreakdownStructureElementID 5920102 datatype. The ProductionLotProjectWorkBreakdownStructureElementID 592098 attribute has a cardinality of zero or one 5920100 meaning that for each instance of the RepetitiveManufacturingConfirmation 592016 entity there may be one ProductionLotProjectWorkBreakdownStructureElementID 592098 attribute.

The ReportingPointID 5920104 attribute is a ReportingPointID 5920108 datatype. The ReportingPointID 5920104 attribute has a cardinality of zero or one 5920106 meaning that for each instance of the RepetitiveManufacturingConfirmation 592016 entity there may be one ReportingPointID 5920104 attribute.

The PlantDataCollectionSystemConfirmationID 5920110 attribute is a PlantDataCollectionSystemConfirmationID 5920114 datatype. The PlantDataCollectionSystemConfirmationID 5920110 attribute has a cardinality of zero or one 5920112 meaning that for each instance of the RepetitiveManufacturingConfirmation 592016 entity there may be one PlantDataCollectionSystemConfirmationID 5920110 attribute.

The ScenarioCode 5920116 attribute is a RepetitiveManufacturingScenarioCode 5920120 datatype. The ScenarioCode 5920116 attribute has a cardinality of one 5920118 meaning that for each instance of the RepetitiveManufacturingConfirmation 592016 entity there is one ScenarioCode 5920116 attribute.

The TypeCode 5920122 attribute is a RepetitiveManufacturingConfirmationTypeCode 5920126 datatype. The TypeCode 5920122 attribute has a cardinality of one 5920124 meaning that for each instance of the RepetitiveManufacturingConfirmation 592016 entity there is one TypeCode 5920122 attribute.

The ScrapQuantityScopeCode 5920128 attribute is a RepetitiveManufacturingConfirmationScrapQuantityScopeCode 5920132 datatype. The ScrapQuantityScopeCode 5920128 attribute has a cardinality of zero or one 5920130 meaning that for each instance of the RepetitiveManufacturingConfirmation 592016 entity there may be one ScrapQuantityScopeCode 5920128 attribute.

The WorkQuantityScopeCode 5920134 attribute is a RepetitiveManufacturingConfirmationWorkQuantityScopeCode 5920138 datatype. The WorkQuantityScopeCode 5920134 attribute has a cardinality of zero or one 5920136 meaning that for each instance of the RepetitiveManufacturingConfirmation 592016 entity there may be one WorkQuantityScopeCode 5920134 attribute.

The GoodsIssueScopeCode 5920140 attribute is a RepetitiveManufacturingConfirmationGoodsIssueScopeCode 5920144 datatype. The GoodsIssueScopeCode 5920140 attribute has a cardinality of zero or one 5920142 meaning that for each instance of the RepetitiveManufacturingConfirmation 592016 entity there may be one GoodsIssueScopeCode 5920140 attribute.

The LogisticsDeviationReasonCode 5920146 attribute is a LogisticsDeviationReasonCode 5920150 datatype. The LogisticsDeviationReasonCode 5920146 attribute has a cardinality of zero or one 5920148 meaning that for each instance of the RepetitiveManufacturingConfirmation 592016 entity there may be one LogisticsDeviationReasonCode 5920146 attribute.

The Description 5920152 attribute is a RepetitiveManufacturingConfirmationDescription 5920156 datatype. The Description 5920152 attribute has a cardinality of zero or one 5920154 meaning that for each instance of the RepetitiveManufacturingConfirmation 592016 entity there may be one Description 5920152 attribute.

The LotSizeIndependentCostsIncludedIndicator 5920158 attribute is an Indicator 5920162 datatype. The LotSizeIndependentCostsIncludedIndicator 5920158 attribute has a cardinality of zero or one 5920160 meaning that for each instance of the RepetitiveManufacturingConfirmation 592016 entity there may be one LotSizeIndependentCostsIncludedIndicator 5920158 attribute.

The ComponentScrapIncludeIndicator 5920164 attribute is an Indicator 5920168 datatype. The ComponentScrapIncludeIndicator 5920164 attribute has a cardinality of zero or one 5920166 meaning that for each instance of the RepetitiveManufacturingConfirmation 592016 entity there may be one ComponentScrapIncludeIndicator 5920164 attribute.

The PostingDate 5920170 attribute is a Date 5920174 datatype. The PostingDate 5920170 attribute has a cardinality of one 5920172 meaning that for each instance of the RepetitiveManufacturingConfirmation 592016 entity there is one PostingDate 5920170 attribute.

The CreationDate 5920176 attribute is a Date 5920180 datatype. The CreationDate 5920176 attribute has a cardinality of one 5920178 meaning that for each instance of the RepetitiveManufacturingConfirmation 592016 entity there is one CreationDate 5920176 attribute.

The ConfirmQuantity 5920182 attribute is a Quantity 5920186 datatype. The ConfirmQuantity 5920182 attribute has a cardinality of zero or one 5920184 meaning that for each instance of the RepetitiveManufacturingConfirmation 592016 entity there may be one ConfirmQuantity 5920182 attribute.

The ScrapQuantity 5920188 attribute is a Quantity 5920192 datatype. The ScrapQuantity 5920188 attribute has a cardinality of zero or one 5920190 meaning that for each instance of the RepetitiveManufacturingConfirmation 592016 entity there may be one ScrapQuantity 5920188 attribute.

The SerialNumberInformation 5920194 package includes a SerialNumberInformation 5920196 entity.

The SerialNumberInformation 5920196 entity has a cardinality of zero or n 5920198 meaning that for each instance of the RepetitiveManufacturingConfirmation 592016 entity there may be one or more SerialNumberInformation 5920196 entities. The SerialNumberInformation 5920196 entity includes a SerialID 5920200 attribute.

The SerialID 5920200 attribute is a SerialID 5920204 datatype. The SerialID 5920200 attribute has a cardinality of one 5920202 meaning that for each instance of the SerialNumberInformation 5920196 entity there is one SerialID 5920200 attribute.

The GoodsMovementInformation 5920206 package includes a GoodsMovementInformation 5920208 entity.

The GoodsMovementInformation 5920208 entity has a cardinality of zero or n 5920210 meaning that for each instance of the RepetitiveManufacturingConfirmation 592016 entity there may be one or more GoodsMovementInformation 5920208 entities. The GoodsMovementInformation 5920208 entity includes various attributes, namely MaterialInternalID 5920212, PlantID 5920218, InventoryManagedLocationInternalID 5920224, BatchID 5920230, ConsignmentStockVendorID 5920236, ConsignmentStockCustomerID 5920242, SalesOrderID 5920248, SalesOrderItemID 5920254, ReservationID 5920260, ReservationItemID 5920266, ProjectWorkBreakdownStructureElementID 5920272, GoodsMovementTypeCode 5920278, InventoryUsabilityStatusCode 5920284, InventorySpecialStockTypeCode 5920290, InventoryValuationTypeCode 5920296, InputQuantity 5920302, DeliveryCompleteIndicator 5920308, WithdrawnCompleteIndicator 5920314, GoodsMovementItemDescription 5920320, GoodsRecipientName 5920326, UnloadingPointName 5920332, GoodsMovementReferenceDocumentTypeCode 5920338, GoodsMovementReasonCode 5920344, BatchExpirationDate 5920350 and BatchProductionDate 5920356.

The MaterialInternalID 5920212 attribute is a ProductInternalID 5920216 datatype. The MaterialInternalID 5920212 attribute has a cardinality of one 5920214 meaning that for each instance of the GoodsMovementInformation 5920208 entity there is one MaterialInternalID 5920212 attribute.

The PlantID 5920218 attribute is a PlantID 5920222 datatype. The PlantID 5920218 attribute has a cardinality of one 5920220 meaning that for each instance of the GoodsMovementInformation 5920208 entity there is one PlantID 5920218 attribute.

The InventoryManagedLocationInternalID 5920224 attribute is a LocationInternalID 5920228 datatype. The InventoryManagedLocationInternalID 5920224 attribute has a cardinality of one 5920226 meaning that for each instance of the GoodsMovementInformation 5920208 entity there is one InventoryManagedLocationInternalID 5920224 attribute.

The BatchID 5920230 attribute is a BatchID 5920234 datatype. The BatchID 5920230 attribute has a cardinality of zero or one 5920232 meaning that for each instance of the GoodsMovementInformation 5920208 entity there may be one BatchID 5920230 attribute.

The ConsignmentStockVendorID 5920236 attribute is a PartyInternalID 5920240 datatype. The ConsignmentStockVendorID 5920236 attribute has a cardinality of zero or one 5920238 meaning that for each instance of the GoodsMovementInformation 5920208 entity there may be one ConsignmentStockVendorID 5920236 attribute.

The ConsignmentStockCustomerID 5920242 attribute is a BusinessPartnerID 5920246 datatype. The ConsignmentStockCustomerID 5920242 attribute has a cardinality of zero or one 5920244 meaning that for each instance of the GoodsMovementInformation 5920208 entity there may be one ConsignmentStockCustomerID 5920242 attribute.

The SalesOrderID 5920248 attribute is a SalesOrderID 5920252 datatype. The SalesOrderID 5920248 attribute has a cardinality of zero or one 5920250 meaning that for each instance of the GoodsMovementInformation 5920208 entity there may be one SalesOrderID 5920248 attribute.

The SalesOrderItemID 5920254 attribute is a SalesOrderItemID 5920258 datatype. The SalesOrderItemID 5920254 attribute has a cardinality of zero or one 5920256 meaning that for each instance of the GoodsMovementInformation 5920208 entity there may be one SalesOrderItemID 5920254 attribute.

The ReservationID 5920260 attribute is a ReservationID 5920264 datatype. The ReservationID 5920260 attribute has a cardinality of zero or one 5920262 meaning that for each instance of the GoodsMovementInformation 5920208 entity there may be one ReservationID 5920260 attribute.

The ReservationItemID 5920266 attribute is a ReservationItemID 5920270 datatype. The ReservationItemID 5920266 attribute has a cardinality of zero or one 5920268 meaning that for each instance of the GoodsMovementInformation 5920208 entity there may be one ReservationItemID 5920266 attribute.

The ProjectWorkBreakdownStructureElementID 5920272 attribute is a ProjectWorkBreakdownStructureElementID 5920276 datatype. The ProjectWorkBreakdownStructureElementID 5920272 attribute has a cardinality of zero or one 5920274 meaning that for each instance of the GoodsMovementInformation 5920208 entity there may be one ProjectWorkBreakdownStructureElementID 5920272 attribute.

The GoodsMovementTypeCode 5920278 attribute is a GoodsMovementTypeCode 5920282 datatype. The GoodsMovementTypeCode 5920278 attribute has a cardinality of one 5920280 meaning that for each instance of the GoodsMovementInformation 5920208 entity there is one GoodsMovementTypeCode 5920278 attribute.

The InventoryUsabilityStatusCode 5920284 attribute is an InventoryUsabilityStatusCode 5920288 datatype. The InventoryUsabilityStatusCode 5920284 attribute has a cardinality of zero or one 5920286 meaning that for each instance of the GoodsMovementInformation 5920208 entity there may be one InventoryUsabilityStatusCode 5920284 attribute.

The InventorySpecialStockTypeCode 5920290 attribute is an InventorySpecialStockTypeCode 5920294 datatype. The InventorySpecialStockTypeCode 5920290 attribute has a cardinality of zero or one 5920292 meaning that for each instance of the GoodsMovementInformation 5920208 entity there may be one InventorySpecialStockTypeCode 5920290 attribute.

The InventoryValuationTypeCode 5920296 attribute is an InventoryValuationTypeCode 5920300 datatype. The InventoryValuationTypeCode 5920296 attribute has a cardinality of zero or one 5920298 meaning that for each instance of the GoodsMovementInformation 5920208 entity there may be one InventoryValuationTypeCode 5920296 attribute.

The InputQuantity 5920302 attribute is a Quantity 5920306 datatype. The InputQuantity 5920302 attribute has a cardinality of one 5920304 meaning that for each instance of the GoodsMovementInformation 5920208 entity there is one InputQuantity 5920302 attribute.

The DeliveryCompleteIndicator 5920308 attribute is an Indicator 5920312 datatype. The DeliveryCompleteIndicator 5920308 attribute has a cardinality of zero or one 5920310 meaning that for each instance of the GoodsMovementInformation 5920208 entity there may be one DeliveryCompleteIndicator 5920308 attribute.

The WithdrawnCompleteIndicator 5920314 attribute is an Indicator 5920318 datatype. The WithdrawnCompleteIndicator 5920314 attribute has a cardinality of zero or one 5920316 meaning that for each instance of the GoodsMovementInformation 5920208 entity there may be one WithdrawnCompleteIndicator 5920314 attribute.

The GoodsMovementItemDescription 5920320 attribute is a GoodsMovementItemDescription 5920324 datatype. The GoodsMovementItemDescription 5920320 attribute has a cardinality of zero or one 5920322 meaning that for each instance of the GoodsMovementInformation 5920208 entity there may be one GoodsMovementInternalDescription 5920320 attribute.

The GoodsRecipientName 5920326 attribute is a GoodsRecipientName 5920330 datatype. The GoodsRecipientName 5920326 attribute has a cardinality of zero or one 5920328 meaning that for each instance of the GoodsMovementInformation 5920208 entity there may be one GoodsRecipientName 5920326 attribute.

The UnloadingPointName 5920332 attribute is an UnloadingPointName 5920336 datatype. The UnloadingPointName 5920332 attribute has a cardinality of zero or one 5920334 meaning that for each instance of the GoodsMovementInformation 5920208 entity there may be one UnloadingPointName 5920332 attribute.

The GoodsMovementReferenceDocumentTypeCode 5920338 attribute is a GoodsMovementReferenceDocumentTypeCode 5920342 datatype. The GoodsMovementReferenceDocumentTypeCode 5920338 attribute has a cardinality of one 5920340 meaning that for each instance of the GoodsMovementInformation 5920208 entity there is one GoodsMovementReferenceDocumentTypeCode 5920338 attribute.

The GoodsMovementReasonCode 5920344 attribute is a GoodsMovementReasonCode 5920348 datatype. The GoodsMovementReasonCode 5920344 attribute has a cardinality of zero or one 5920346 meaning that for each instance of the GoodsMovementInformation 5920208 entity there may be one GoodsMovementReasonCode 5920344 attribute.

The BatchExpirationDate 5920350 attribute is a Date 5920354 datatype. The BatchExpirationDate 5920350 attribute has a cardinality of zero or one 5920352 meaning that for each instance of the GoodsMovementInformation 5920208 entity there may be one BatchExpirationDate 5920350 attribute.

The BatchProductionDate 5920356 attribute is a Date 5920360 datatype. The BatchProductionDate 5920356 attribute has a cardinality of zero or one 5920358 meaning that for each instance of the GoodsMovementInformation 5920208 entity there may be one BatchProductionDate 5920356 attribute.

MessageHeader Package

A MessageHeader package groups the business information that is relevant for sending a business document in a message.

RepetitiveManufacturingConfirmation Package

A RepetitiveManufacturingConfirmation package groups the business information relevant for the repetitive manufacturing confirmation.

Message Data Type

The message data type RepetitiveManufacturingConfirmationCreateConfirmationMessage contains the Repetitive confirmation Confirmation information included in the business document and the business information that is relevant for sending a business document in a message. FIG. 590 shows a RepetitiveManufacturingConfirmationCreateConfirmationMessage 590000 package. The RepetitiveManufacturingConfirmationCreateConfirmationMessage 590000 package is a RepetitiveManufacturingConfirmationCreateConfirmationMessage 590004 datatype. The RepetitiveManufacturingConfirmationCreateConfirmationMessage 590000 package includes a RepetitiveManufacturingConfirmationCreateConfirmationMessag 590002 entity. The RepetitiveManufacturingConfirmationCreateConfirmationMessage 590000 package includes various packages, namely MessageHeader 590006, RepetitiveManufacturingConfirmation 590014 and Log 590026.

The MessageHeader 590006 package is a BasicBusinessDocumentMessageHeader 590012 datatype. The MessageHeader 590006 package includes a MessageHeader 590008 entity.

The RepetitiveManufacturingConfirmation 590014 package includes a RepetitiveManufacturingConfirmation 590016 entity.

The RepetitiveManufacturingConfirmation 590016 entity has a cardinality of zero or one 590018 meaning that for each instance of the RepetitiveManufacturingConfirmationCreateConfirmationMessag 590002 entity there may be one RepetitiveManufacturingConfirmation 590016 entity. The RepetitiveManufacturingConfirmation 590016 entity includes an ID 590020 attribute.

The ID 590020 attribute is a RepetitiveManufacturingConfirmationID 590024 datatype. The ID 590020 attribute has a cardinality of one 590022 meaning that for each instance of the RepetitiveManufacturingConfirmation 590016 entity there is one ID 590020 attribute.

The Log 590026 package is a Log 590032 datatype. The Log 590026 package includes a Log 590028 entity.

The Log 590028 entity has a cardinality of one 590030 meaning that for each instance of the RepetitiveManufacturingConfirmationCreateConfirmationMessag 590002 entity there is one Log 590028 entity.

MessageHeader Package

A MessageHeader package groups the business information that is relevant for sending a business document in a message.

MessageHeader

A MessageHeader contains the information to identify a business document in a message from the perspective of the sending application. A BasicBusinessDocumentMessageHeader is a collection of identification data of an instance of a business document message, or reference data to another instance of a business document message, or both. The subject of the identification data is the message instance that conveys them, whereas the reference data are related to a different message instance previously exchanged between the same interaction parties.

RepetitiveManufacturingConfirmation Package

A RepetitiveManufacturingConfirmation package groups the business information about the repetitive manufacturing confirmation.

RepetitiveManufacturingConfirmation

RepetitiveManufacturingConfirmation contains the information about the repetitive manufacturing confirmation carried out. ID is the unique identifier of a confirmation in repetitive manufacturing.

Log Package

Log

A log is a sequence of messages that may result from the execution of an application task.

Message Data Type

The message data type RepetitiveManufacturingConfirmationCancelRequestMessage_sync contains the Repetitive confirmation Confirmation information included in the business document and the business information that is relevant for sending a business document in a message. FIG. 589 shows a RepetitiveManufacturingCon-firmationCancelRequestMessage_sync 589000 package.

The RepetitiveManufacturingConfirmationCancelRequestMessage_sync 589000 package is a RepetitiveManufacturingConfirmationCancelRequestMessage_sync 589004 datatype. The RepetitiveManufacturingConfirmationCancelRequestMessage_sync 589000 package includes a RepetitiveManufacturingConfirmationCancelRequestMessage_sync 589002 entity. The RepetitiveManufacturingConfirmationCancelRequestMessage_sync 589000 package includes various packages, namely MessageHeader 589006 and RepetitiveManufacturingConfirmation 589014.

The MessageHeader 589006 package is a BasicBusinessDocumentMessageHeader 589012 datatype. The MessageHeader 589006 package includes a MessageHeader 589008 entity.

The MessageHeader 589008 entity has a cardinality of one 589010 meaning that for each instance of the RepetitiveManufacturingConfirmationCancelRequestMessage_sync 589002 entity there is one MessageHeader 589008 entity.

The RepetitiveManufacturingConfirmation 589014 package includes a RepetitiveManufacturingConfirmation 589016 entity.

The RepetitiveManufacturingConfirmation 589016 entity has a cardinality of zero or one 589018 meaning that for each instance of the RepetitiveManufacturingConfirmationCancelRequestMessage_sync 589002 entity there may be one RepetitiveManufacturingConfirmation 589016 entity. The RepetitiveManufacturingConfirmation 589016 entity includes various attributes, namely ID 589020 and PostingDate 589026.

The ID 589020 attribute is a RepetitiveManufacturingConfirmationID 589024 datatype. The ID 589020 attribute has a cardinality of one 589022 meaning that for each instance of the RepetitiveManufacturingConfirmation 589016 entity there is one ID 589020 attribute.

The PostingDate 589026 attribute is a Date 589030 datatype. The PostingDate 589026 attribute has a cardinality of one 589028 meaning that for each instance of the RepetitiveManufacturingConfirmation 589016 entity there is one PostingDate 589026 attribute.

MessageHeader Package

A MessageHeader package groups the business information that is relevant for sending a business document in a message.

RepetitiveManufacturingConfirmation Package

RepetitiveManufacturingConfirmation

A RepetitiveManufacturingConfirmation entity groups the business information about the repetitive confirmation to be cancelled. ID is the unique identifier of a single confirmation in repetitive manufacturing that is to be cancelled. PostingDate is the posting date of the cancellation of the repetitive manufacturing confirmation.

Message Data Type

The message data type RepetitiveManufacturingConfirmationCancelConfirmationMessage_sync contains the Repetitive confirmation Confirmation information included in the business document and the business information that is relevant for sending a business document in a message. FIG. 588 shows a RepetitiveManufacturingConfirmationCancelConfirmationMessage_sync 588000 package. The RepetitiveManufacturingConfirmationCancelConfirmationMessage_sync 588000 package is a RepetitiveManufacturingConfirmationCancelConfirmationMessage_sync 588004 datatype. The RepetitiveManufacturingConfirmationCancelConfirmationMessage_sync 588000 package includes a Repetitive ManufacturingConfirmationCancelConfirmationMessage_sync 588002 entity. The RepetitiveManufacturingConfirmationCancelConfirmationMessage_sync 588000 package includes various packages, namely MessageHeader 588006, RepetitiveManufacturingConfirmation 588014 and Log 588026.

The MessageHeader 588006 package is a BasicBusinessDocumentMessageHeader 588012 datatype. The MessageHeader 588006 package includes a MessageHeader 588008 entity.

The RepetitiveManufacturingConfirmation 588014 package includes a RepetitiveManufacturingConfirmation 588016 entity.

The RepetitiveManufacturingConfirmation 588016 entity has a cardinality of zero or one 588018 meaning that for each instance of the RepetitiveManufacturingConfirmationCancelConfirmationMessage_sync 588002 entity there may be one RepetitiveManufacturingConfirmation 588016 entity. The RepetitiveManufacturingConfirmation 588016 entity includes an ID 588020 attribute.

The ID 588020 attribute is a RepetitiveManufacturingConfirmationID 588024 datatype. The ID 588020 attribute has a cardinality of one 588022 meaning that for each instance of the RepetitiveManufacturingConfirmation 588016 entity there is one ID 588020 attribute.

The Log 588026 package is a Log 588032 datatype. The Log 588026 package includes a Log 588028 entity.

The Log 588028 entity has a cardinality of one 588030 meaning that for each instance of the RepetitiveManufacturingConfirmationCancelConfirmationMessage_sync 588002 entity there is one Log 588028 entity.

MessageHeader Package

A MessageHeader package groups the business information that is relevant for sending a business document in a message.

RepetitiveManufacturingConfirmation Package

A RepetitiveManufacturingConfirmation package groups the business information relevant for the repetitive manufacturing confirmation.

RepetitiveManufacturingConfirmation

A RepetitiveManufacturingConfirmation entity groups the business information about cancellation of the repetitive confirmation. ID is the unique identifier of a single confirmation in repetitive manufacturing to be cancelled.

Log Package

Log

A log is a sequence of messages that may result from the execution of an application task.

SalesOrder-Interfaces

The SalesOrder Interfaces provide the service operations required in an A2X process for the communication between a Seller and the Sales Order Processing. Depending on the Seller's requirements SalesOrders have to be displayed, created or changed. For example the Seller performs a trending analysis for one of his customers. In order to gain an overview of the orders which are blocked for delivery the Seller queries SalesOrders for display. In another case the Seller needs to check item information of a specific SalesOrderItem. Therefore he can query the SalesOrderItem.

Message Choreography

The message choreography of FIG. 594 describes a possible logical sequence of messages that can be used to realize a sales order business scenario.

A SalesOrderItemByIDQuery_sync is an inquiry to the Sales Order Processing to return a SalesOrderItem by the selection criteria SalesOrderID and SalesOrderItemID. The structure of the message type SalesOrderItemByIDQuery_sync is specified by the message data type SalesOrderItemByIDQueryMessage_sync A SalesOrderItemByIDResponse_sync is the response to an inquiry SalesOrderItemByIDQuery_sync and contains a SalesOrderItem. The structure of the message type SalesOrderItemByIDResponses_sync is specified by the message data type SalesOrderItemByIDResponseMessage_sync which is derived from the message data type SalesOrderMessage.

A SalesOrderBasicDataByBuyerAndDeliveryBlockedQuery_sync is an inquiry to the Sales Order Processing to return basic data of SalesOrders which are blocked for delivery for the selection criteria. The structure of the message type SalesOrderBasicDataByBuyerAndDeliveryBlockedQuery_sync is specified by the message data type SalesOrderBasicDataByBuyerAndDeliveryBlockedQueryMessage_sync.

A SalesOrderBasicDataByBuyerAndDeliveryBlockedResponse_sync is the response to an inquiry SalesOrderBasicDataByBuyerAndDeliveryBlockedQuery_sync. It contains basic data of SalesOrders which are blocked for delivery matching the selection criteria of the inquiry. The structure of the message type SalesOrderBasicDataByBuyerAndDeliveryBlockedResponse_sync is specified by the message data type SalesOrderBasicDataByBuyerAndDeliveryBlockedResponseMessage_sync which is derived from the message data type SalesOrderMessage.

A SalesOrderCreateRequest_sync is a request to the Sales Order Processing to create a SalesOrder. The structure of the message type SalesOrderCreateRequest_sync is specified by the message data type SalesOrderCreateRequestMessage_sync, which is derived from the message data type SalesOrderMessage.

A SalesOrderCreateConfirmation_sync is a confirmation sent from the Sales Order Processing concerning the request to create a SalesOrder. The structure of the message type SalesOrderCreateConfirmation_sync is specified by the message data type SalesOrderCreateConfirmationMessage_sync, which is derived from the message data type SalesOrderMessage.

A SalesOrderItemScheduleLineChangeRequest_sync is a request to the Sales Order Processing to change a SalesOrderItemScheduleLine. The structure of the message type SalesOrderItemScheduleLineChangeRequest_sync is specified by the message data type SalesOrderItemScheduleLineChangeRequestMessage_sync, which is derived from the message data type SalesOrderMessage.

A SalesOrderItemScheduleLineChangeConfirmation_sync is a confirmation sent from the Sales Order Processing concerning the request to change a SalesOrderItemScheduleLine. The structure of the message type SalesOrderItemScheduleLineChangeConfirmation sync is specified by the message data type SalesOrderItemScheduleLineChangeConfirmationMessage_sync, which is derived from the message data type SalesOrderMessage.

A SalesOrderByIDQuery_sync is an inquiry to the Sales Order Processing to return a SalesOrder by the selection criterion SalesOrderID. The structure of the message type SalesOrderByIDQuery_sync is specified by the message data type SalesOrderByIDQueryMessage A SalesOrderByIDResponse_sync is the response to an inquiry SalesOrderByIDQuery_sync and contains a SalesOrder. The structure of the message type SalesOrderByIDResponses_sync is specified by the message data type SalesOrderByIDResponseMessage_sync which is derived from the message data type SalesOrderMessage.

A SalesOrderItemByBuyerAndProductQuery_sync is an inquiry to the Sales Order Processing to return SalesOrderItems. The structure of the message type SalesOrderItemByBuyerAndProductQuery_sync is specified by the message data type SalesOrderItemByBuyerAndProductQueryMessage_sync A SalesOrderItemByBuyerAndProductResponse_sync is the response to an inquiry SalesOrderItemByBuyerAndProductQuery_sync. The structure of the message type SalesOrderItemByBuyerAndProductResponses_sync is specified by the message data type SalesOrderItemByBuyerAndProductResponseMessage_sync which is derived from the message data type SalesOrderMessage.

A SalesOrderItemByAccountAssignmentQuery_sync is an inquiry to the Sales Order Processing for SalesOrder items by account assignment data. The structure of the message type SalesOrderItemByAccountAssignmentQuery_sync is specified by the message data type SalesOrderItemByAccountAssignmentQueryMessage_sync.

A SalesOrderItemByAccountAssignmentResponse_sync is the response to the inquiry of SalesOrderItemByAccountAssignmentQuery_sync. The structure of the message type SalesOrderItemByAccountAssignmentResponse_sync is specified by the message data type SalesOrderItemByAccountAssignmentResponseMessage_sync, which is derived from the message data type SalesOrderMessage.

A SalesOrderBasicDataByBuyerAndBasicDataQuery_sync is an inquiry to the Sales Order Processing for basic data of SalesOrders fulfilling the selection SalesOrderBasicDataSelectionByBuyerAndBasicData. The structure of the message type SalesOrderBasicDataByBuyerAndBasicDataQuery_sync is specified by the message data type SalesOrderBasicDataByBuyerAndBasicDataQueryMessage_sync.

A SalesOrderBasicDataByBuyerAndBasicDataResponse_sync is the response to the inquiry of SalesOrderBasicDataByBuyerAndBasicDataQuery_sync. The structure of the message type SalesOrderBasicDataByBuyerAndBasicDataResponse_sync is specified by the message data type SalesOrderBasicDataByBuyerAndBasicDataResponseMessage_sync, which is derived from the message data type SalesOrderMessage.

A SalesOrderBasicDataByBuyerAndIncompletenessQuery_sync is an inquiry to the Sales Order Processing for basic data of SalesOrders fulfilling the selection SalesOrderBasicDataSelectionByBuyerAndIncompleteness. The structure of the message type SalesOrderBasicDataByBuyerAndIncompletenessQuery_sync is specified by the message data type SalesOrderBasicDataByBuyerAndIncompletenessQueryMessage_sync.

A SalesOrderBasicDataByBuyerAndIncompletenessResponse_sync is the response to the inquiry of SalesOrderBasicDataByBuyerAndIncompletenessQuery_sync. The structure of the message type SalesOrderBasicDataByBuyerAndIncompletenessResponse_sync is specified by the message data type SalesOrderBasicDataByBuyerAndIncompletenessResponseMessage_sync, which is derived from the message data type SalesOrderMessage.

A SalesOrderBasicDataByBuyerAndInvoicingBlockedQuery_sync is an inquiry to the Sales Order Processing for basic data of SalesOrders fulfilling the selection SalesOrderBasicDataSelectionByBuyerAndInvoicingBlocked. The structure of the message type SalesOrderBasicDataByBuyerAndInvoicingBlockedQuery_sync is specified by the message data type SalesOrderBasicDataByBuyerAndInvoicingBlockedQueryMessage_sync.

A SalesOrderBasicDataByBuyerAndInvoicingBlockedResponse_sync is the response to the inquiry of SalesOrderBasicDataByBuyerAndInvoicingBlockedQuery_sync. The structure of the message type SalesOrderBasicDataByBuyerAndInvoicingBlockedResponse_sync is specified by the message data type SalesOrderBasicDataByBuyerAndInvoicingBlockedResponseMessage_sync, which is derived from the message data type SalesOrderMessage.

A SalesOrderBasicDataByBuyerAndCreditBlockedQuery_sync is an inquiry to the Sales Order Processing for basic data of SalesOrders fulfilling the selection SalesOrderBasicDataSelectionByBuyerAndCreditBlocked. The structure of the message type SalesOrderBasicDataByBuyerAndCreditBlockedQuery_sync is specified by the message data type SalesOrderBasicDataByBuyerAndCreditBlockedQueryMessage_sync.

A SalesOrderBasicDataByBuyerAndCreditBlockedResponse_sync is the response to the inquiry of SalesOrderBasicDataByBuyerAndCreditBlockedQuery_sync. The structure of the message type SalesOrderBasicDataByBuyerAndCreditBlockedResponse_sync is specified by the message data type SalesOrderBasicDataByBuyerAndCreditBlockedResponseMessage_sync, which is derived from the message data type SalesOrderMessage.

For example, a "Seller" system 594002 can query a sales order item by ID using the SalesOrderItemByIDQuery_sync message 594006 as shown, for example, in FIG. 603. A "Sales Order Processing" system 594004 can respond to the query using the SalesOrderItemByIDResponse_sync message 594008. The "Seller" system 594002 can query a sales order item by buyer and delivery blocked using the SalesOrderBasicDataByBuyerAndDeliveryBlockedQuery_sync message 594010 as shown, for example, in FIG. 597. The "Sales Order Processing" system 594004 can respond to the query using the SalesOrderBasicDataByBuyerAndDeliveryBlockedResponse_sync message 594012. The "Seller" system 594002 can request to create a sales order using the SalesOrderCreateRequest_sync message 594014. The "Sales Order Processing" system 594004 can confirm the request using the SalesOrderCreateConfirmation_sync message 594016. The "Seller" system 594002 can request to create a sales order item schedule line change using the SalesOrderItemScheduleLineChangeRequest_sync message 594018. The "Sales Order Processing" system 594004 can confirm the request using the SalesOrderItemScheduleLineChangeConfirmation_sync message 594020. The "Seller" system 594002 can query a sales order by ID using the SalesOrderByIDQuery_sync message 594022 as shown, for example, in FIG. 600. The "Sales Order Processing" system 594004 can respond to the query using the SalesOrderByIDResponse_sync message 594024. The "Seller" system 594002 can query a sales order item by buyer and product D using the SalesOrderItemByBuyerAndProductQuery_sync message 594026 as shown, for example, in FIG. 602. The "Sales Order Processing" system 594004 can respond to the query using the SalesOrderItemByBuyerAndProductResponse_sync message 594028. The "Seller" system 594002 can query a sales order item by account assignment using the SalesOrderItemByAccountAssignmentQuery_sync message 594030 as shown, for example, in FIG. 601. The "Sales Order Processing" system 594004 can respond to the query using the SalesOrderItemByAccountAssignmentResponse_sync message 594032. The "Seller" system 594002 can query sales order basic data by buyer and basic data using the SalesOrderBasicDataByBuyerAndBasicDataQuery_sync message 594034 as shown, for example, in FIG. 595. The "Sales Order Processing" system 594004 can respond to the query using the SalesOrderBasicDataByBuyerAndBasicDataResponse_sync message 594036. The "Seller" system 594002 can query sales order basic data by buyer and incompleteness using the SalesOrderBasicDataByBuyerAndIncompletenessQuery_sync message 594038 as shown, for example, in FIG. 598. The "Sales Order Processing" system 594004 can respond to the query using the SalesOrderBasicDataByBuyerAndIncompletenessResponse_sync message 594040. The "Seller" system 594002 can query sales order basic data by buyer and invoicing using the SalesOrderBasicDataByBuyerAndInvoicingBlockedQuery_sync message 594042 as shown, for example, in FIG. 599. The "Sales Order Processing" system 594004 can respond to the query using the SalesOrderBasicDataByBuyerAndInvoicingBlockedResponse_sync message 594044. The "Seller" system 594002 can query sales order basic data by buyer and invoicing blocked using the SalesOrderBasicDataByBuyerAndCreditBlockedQuery_sync message 594046 as shown, for example, in FIG. 596. The "Sales Order Processing" system 594004 can respond to the query using the SalesOrderBasicDataByBuyerAndCreditBlockedResponse_sync message 594048.

Message Data Type SalesOrderMessage

The message data type SalesOrderMessage contains the SalesOrder included in the business document and the information of the message log. It contains the SalesOrder and Log packages. The message data type SalesOrderMessage may be used as an abstract maximal message data type, which unifies all packages and entities for the following concrete message data types: SalesOrderItemByIDResponseMessage_sync, SalesOrderBasicDataByBuyerAndDeliveryBlockedResponseMessage_sync, SalesOrderCreateRequestMessage_sync, SalesOrderCreateConfirmationMessage_sync, SalesOrderItemScheduleLineChangeRequestMessage_sync, SalesOrderItemScheduleLineChangeConfirmationMessage_sync, SalesOrderByIDResponseMessage_sync, SalesOrderItemByBuyerAndProductResponseMessage_sync, SalesOrderItemByAccountAssignmentResponseMessage_sync, SalesOrderBasicDataByBuyerAndBasicDataResponseMessage_sync, SalesOrderBasicDataByBuyerAndIncompletenessResponseMessage_sync, SalesOrderBasicDataByBuyerAndInvoicingBlockedResponseMessage_sync, and SalesOrderBasicDataByBuyerAndCreditBlockedResponseMessage_sync.

FIGS. 626-1 through 626-14 show a SalesOrderMessage 626000 package. The SalesOrderMessage 626000 package is a SalesOrderMessage 626004 datatype. The SalesOrderMessage 626000 package includes a SalesOrderMessage 626002 entity. The SalesOrderMessage 626000 package includes various packages, namely SalesOrder 626020 and Log 6260530.

The SalesOrder 626020 package includes a SalesOrder 626022 entity. The SalesOrder 626020 package includes various packages, namely Party 626062, SalesTerms 6260154, DateTerms 6260172, PricingTerms 6260184, TotalValues 6260202, DeliveryTerms 6260220, InvoiceTerms 6260236 and Item 6260246.

The SalesOrder 626022 entity has a cardinality of zero to n 626024 meaning that for each instance of the SalesOrderMessage 626002 entity there may be zero or more SalesOrder 626022 entities. The SalesOrder 626022 entity includes various attributes, namely ID 626026, Date 626032, ProcessingTypeCode 626038, BuyerID 626044, DeliveryBlockingReasonCode 626050 and InvoiceBlockingReasonCode 626056.

The ID 626026 attribute is a SalesOrderID 626030 datatype. The ID 626026 attribute has a cardinality of one 626028 meaning that for each instance of the SalesOrder 626022 entity there is one ID 626026 attribute.

The Date 626032 attribute is a Date 626036 datatype. The Date 626032 attribute has a cardinality of zero or one 626034 meaning that for each instance of the SalesOrder 626022 entity there may be one Date 626032 attribute.

The ProcessingTypeCode 626038 attribute is a BusinessTransactionDocumentProcessingTypeCode 626042 datatype. The ProcessingTypeCode 626038 attribute has a cardinality of one 626040 meaning that for each instance of the SalesOrder 626022 entity there is one ProcessingTypeCode 626038 attribute.

The BuyerID 626044 attribute is a BusinessTransactionDocumentID 626048 datatype. The BuyerID 626044 attribute has a cardinality of zero or one 626046 meaning that for each instance of the SalesOrder 626022 entity there may be one BuyerID 626044 attribute.

The DeliveryBlockingReasonCode 626050 attribute is a BlockingReasonCode 626054 datatype. The DeliveryBlockingReasonCode 626050 attribute has a cardinality of zero or one 626052 meaning that for each instance of the SalesOrder 626022 entity there may be one DeliveryBlockingReasonCode 626050 attribute.

The InvoiceBlockingReasonCode 626056 attribute is a BlockingReasonCode 626060 datatype. The InvoiceBlockingReasonCode 626056 attribute has a cardinality of zero or one 626058 meaning that for each instance of the SalesOrder 626022 entity there may be one InvoiceBlockingReasonCode 626056 attribute.

The Party 626062 package includes various entities, namely BuyerParty 626064, GoodsRecipientParty 626080, BillToParty 626096, PayerParty 6260112, ResponsibleEmployeeParty 6260128 and SalesOrganisationParty 6260144.

The BuyerParty 626064 entity has a cardinality of one 626066 meaning that for each instance of the SalesOrder 626022 entity there is one BuyerParty 626064 entity. The BuyerParty 626064 entity includes various attributes, namely InternalID 626068 and FormattedName 626074.

The InternalID 626068 attribute is a PartyInternalID 626072 datatype. The InternalID 626068 attribute has a cardinality of one 626070 meaning that for each instance of the BuyerParty 626064 entity there is one InternalID 626068 attribute.

The FormattedName 626074 attribute is a LONG_Name, Qualifier:PartyFormatted 626078 datatype. The FormattedName 626074 attribute has a cardinality of zero or one 626076 meaning that for each instance of the BuyerParty 626064 entity there may be one FormattedName 626074 attribute.

The GoodsRecipientParty 626080 entity has a cardinality of zero or one 626082 meaning that for each instance of the SalesOrder 626022 entity there may be one GoodsRecipientParty 626080 entity. The GoodsRecipientParty 626080 entity includes various attributes, namely InternalID 626084 and FormattedName 626090.

The InternalID 626084 attribute is a PartyInternalID 626088 datatype. The InternalID 626084 attribute has a cardinality of one 626086 meaning that for each instance of the GoodsRecipientParty 626080 entity there is one InternalID 626084 attribute.

The FormattedName 626090 attribute is a LONG_Name, Qualifier:PartyFormatted 626094 datatype. The FormattedName 626090 attribute has a cardinality of zero or one 626092 meaning that for each instance of the GoodsRecipientParty 626080 entity there may be one FormattedName 626090 attribute.

The BillToParty 626096 entity has a cardinality of zero or one 626098 meaning that for each instance of the SalesOrder 626022 entity there may be one BillToParty 626096 entity. The BillToParty 626096 entity includes various attributes, namely InternalID 6260100 and FormattedName 6260106.

The InternalID 6260100 attribute is a PartyInternalID 6260104 datatype. The InternalID 6260100 attribute has a cardinality of one 6260102 meaning that for each instance of the BillToParty 626096 entity there is one InternalID 6260100 attribute.

The FormattedName 6260106 attribute is a LONG_Name, Qualifier:PartyFormatted 6260110 datatype. The FormattedName 6260106 attribute has a cardinality of zero or one 6260108 meaning that for each instance of the BillToParty 626096 entity there may be one FormattedName 6260106 attribute.

The PayerParty 6260112 entity has a cardinality of zero or one 6260114 meaning that for each instance of the SalesOrder 626022 entity there may be one PayerParty 6260112 entity. The PayerParty 6260112 entity includes various attributes, namely InternalID 6260116 and FormattedName 6260122.

The InternalID 6260116 attribute is a PartyInternalID 6260120 datatype. The InternalID 6260116 attribute has a cardinality of one 6260118 meaning that for each instance of the PayerParty 6260112 entity there is one InternalID 6260116 attribute.

The FormattedName 6260122 attribute is a LONG_Name, Qualifier:PartyFormatted 6260126 datatype. The FormattedName 6260122 attribute has a cardinality of zero or one 6260124 meaning that for each instance of the PayerParty 6260112 entity there may be one FormattedName 6260122 attribute.

The ResponsibleEmployeeParty 6260128 entity has a cardinality of zero or one 6260130 meaning that for each instance of the SalesOrder 626022 entity there may be one ResponsibleEmployeeParty 6260128 entity. The ResponsibleEmployeeParty 6260128 entity includes various attributes, namely InternalID 6260132 and FormattedName 6260138.

The InternalID 6260132 attribute is a PartyInternalID 6260136 datatype. The InternalID 6260132 attribute has a cardinality of one 6260134 meaning that for each instance of the ResponsibleEmployeeParty 6260128 entity there is one InternalID 6260132 attribute.

The FormattedName 6260138 attribute is a LANGUAGE-INDEPENDENT_LONG_Name,Qualifier:PersonFormatted 6260142 datatype. The FormattedName 6260138 attribute has a cardinality of zero or one 6260140 meaning that for each instance of the ResponsibleEmployeeParty 6260128 entity there may be one FormattedName 6260138 attribute.

The SalesOrganisationParty 6260144 entity has a cardinality of one 6260146 meaning that for each instance of the SalesOrder 626022 entity there is one SalesOrganisationParty 6260144 entity. The SalesOrganisationParty 6260144 entity includes an InternalID 6260148 attribute.

The InternalID 6260148 attribute is a PartyInternalID 6260152 datatype. The InternalID 6260148 attribute has a cardinality of one 6260150 meaning that for each instance of the SalesOrganisationParty 6260144 entity there is one InternalID 6260148 attribute.

The SalesTerms 6260154 package includes a SalesTerms 6260156 entity.

The SalesTerms 6260156 entity has a cardinality of one 6260158 meaning that for each instance of the SalesOrder 626022 entity there is one SalesTerms 6260156 entity. The SalesTerms 6260156 entity includes various attributes, namely DistributionChannelCode 6260160 and DivisionCode 6260166.

The DistributionChannelCode 6260160 attribute is a DistributionChannelCode 6260164 datatype. The DistributionChannelCode 6260160 attribute has a cardinality of one 6260162 meaning that for each instance of the SalesTerms 6260156 entity there is one DistributionChannelCode 6260160 attribute.

The DivisionCode 6260166 attribute is a DivisionCode 6260170 datatype. The DivisionCode 6260166 attribute has a cardinality of one 6260168 meaning that for each instance of the SalesTerms 6260156 entity there is one DivisionCode 6260166 attribute.

The DateTerms 6260172 package includes a DateTerms 6260174 entity.

The DateTerms 6260174 entity has a cardinality of one 6260176 meaning that for each instance of the SalesOrder 626022 entity there is one DateTerms 6260174 entity. The DateTerms 6260174 entity includes a RequestDate 6260178 attribute.

The RequestDate 6260178 attribute is a Date 6260182 datatype. The RequestDate 6260178 attribute has a cardinality of zero or one 6260180 meaning that for each instance of the DateTerms 6260174 entity there may be one RequestDate 6260178 attribute.

The PricingTerms 6260184 package includes a PricingTerms 6260186 entity.

The PricingTerms 6260186 entity has a cardinality of one 6260188 meaning that for each instance of the SalesOrder 626022 entity there is one PricingTerms 6260186 entity. The PricingTerms 6260186 entity includes various attributes, namely CurrencyCode 6260190 and PriceDeterminationDate 6260196.

The CurrencyCode 6260190 attribute is a CurrencyCode 6260194 datatype. The CurrencyCode 6260190 attribute has a cardinality of one 6260192 meaning that for each instance of the PricingTerms 6260186 entity there is one CurrencyCode 6260190 attribute.

The PriceDeterminationDate 6260196 attribute is a DateTime 6260200 datatype. The PriceDeterminationDate 6260196 attribute has a cardinality of one 6260198 meaning that for each instance of the PricingTerms 6260186 entity there is one PriceDeterminationDate 6260196 attribute.

The TotalValues 6260202 package includes a TotalValues 6260204 entity.

The TotalValues 6260204 entity has a cardinality of zero or one 6260206 meaning that for each instance of the SalesOrder 626022 entity there may be one TotalValues 6260204 entity. The TotalValues 6260204 entity includes various attributes, namely GrossWeightMeasure 6260208 and NetAmount 6260214.

The GrossWeightMeasure 6260208 attribute is a Measure 6260212 datatype. The GrossWeightMeasure 6260208 attribute has a cardinality of zero or one 6260210 meaning that for each instance of the TotalValues 6260204 entity there may be one GrossWeightMeasure 6260208 attribute.

The NetAmount 6260214 attribute is an Amount 6260218 datatype. The NetAmount 6260214 attribute has a cardinality of zero or one 6260216 meaning that for each instance of the TotalValues 6260204 entity there may be one NetAmount 6260214 attribute.

The DeliveryTerms 6260220 package includes a DeliveryTerms 6260222 entity.

The DeliveryTerms 6260222 entity includes various attributes, namely Incoterms 6260224 and PartialDeliveryControlCode 6260230.

The Incoterms 6260224 attribute is an Incoterms 6260228 datatype. The Incoterms 6260224 attribute has a cardinality of zero or one 6260226 meaning that for each instance of the DeliveryTerms 6260222 entity there may be one Incoterms 6260224 attribute.

The PartialDeliveryControlCode 6260230 attribute is a PartialDeliveryControlCode 6260234 datatype. The PartialDeliveryControlCode 6260230 attribute has a cardinality of zero or one 6260232 meaning that for each instance of the DeliveryTerms 6260222 entity there may be one PartialDeliveryControlCode 6260230 attribute.

The InvoiceTerms 6260236 package includes an InvoiceTerms 6260238 entity.

The InvoiceTerms 6260238 entity includes an InvoicingDate 6260240 attribute.

The InvoicingDate 6260240 attribute is a Date 6260244 datatype. The InvoicingDate 6260240 attribute has a cardinality of zero or one 6260242 meaning that for each instance of the InvoiceTerms 6260238 entity there may be one InvoicingDate 6260240 attribute.

The Item 6260246 package includes an Item 6260248 entity. The Item 6260246 package includes various packages, namely ProductInformation 6260276, Party 6260288, Location 6260380, SalesTerms 6260392, DeliveryTerms 6260410, InvoiceTerms 6260428, TotalValues 6260440 and ScheduleLine 6260488.

The Item 6260248 entity has a cardinality of zero or one 6260250 meaning that for each instance of the SalesOrder 626022 entity there may be one Item 6260248 entity. The Item 6260248 entity includes various attributes, namely ID 6260252, Description 6260258, CancellationReasonCode 6260264 and InvoicingBlockingReasonCode 6260270.

The ID 6260252 attribute is a SalesOrderItemID 6260256 datatype. The ID 6260252 attribute has a cardinality of one 6260254 meaning that for each instance of the Item 6260248 entity there is one ID 6260252 attribute.

The Description 6260258 attribute is a SHORT_Description 6260262 datatype. The Description 6260258 attribute has a cardinality of zero or one 6260260 meaning that for each instance of the Item 6260248 entity there may be one Description 6260258 attribute.

The CancellationReasonCode 6260264 attribute is a CancellationReasonCode 6260268 datatype. The CancellationReasonCode 6260264 attribute has a cardinality of zero or one 6260266 meaning that for each instance of the Item 6260248 entity there may be one CancellationReasonCode 6260264 attribute.

The InvoicingBlockingReasonCode 6260270 attribute is a BlockingReasonCode 6260274 datatype. The InvoicingBlockingReasonCode 6260270 attribute has a cardinality of zero or one 6260272 meaning that for each instance of the Item 6260248 entity there may be one InvoicingBlockingReasonCode 6260270 attribute.

The ProductInformation 6260276 package includes a Product 6260278 entity.

The Product 6260278 entity has a cardinality of zero or one 6260280 meaning that for each instance of the Item 6260248 entity there may be one Product 6260278 entity. The Product 6260278 entity includes a SellerID 6260282 attribute.

The SellerID 6260282 attribute is a ProductPartyID 6260286 datatype. The SellerID 6260282 attribute has a cardinality of one 6260284 meaning that for each instance of the Product 6260278 entity there is one SellerID 6260282 attribute.

The Party 6260288 package includes various entities, namely BuyerParty 6260290, GoodsRecipientParty 6260306, BillToParty 6260322, PayerParty 6260338, ResponsibleEmployeeParty 6260354 and SalesOrganisationParty 6260370.

The BuyerParty 6260290 entity has a cardinality of zero or one 6260292 meaning that for each instance of the Item 6260248 entity there may be one BuyerParty 6260290 entity. The BuyerParty 6260290 entity includes various attributes, namely InternalID 6260294 and FormattedName 6260300.

The InternalID 6260294 attribute is a PartyInternalID 6260298 datatype. The InternalID 6260294 attribute has a cardinality of one 6260296 meaning that for each instance of the BuyerParty 6260290 entity there is one InternalID 6260294 attribute.

The FormattedName 6260300 attribute is a LONG_Name, Qualifier:PartyFormatted 6260304 datatype. The FormattedName 6260300 attribute has a cardinality of zero or one 6260302 meaning that for each instance of the BuyerParty 6260290 entity there may be one FormattedName 6260300 attribute.

The GoodsRecipientParty 6260306 entity has a cardinality of zero or one 6260308 meaning that for each instance of the Item 6260248 entity there may be one GoodsRecipientParty 6260306 entity. The GoodsRecipientParty 6260306 entity includes various attributes, namely InternalID 6260310 and FormattedName 6260316.

The InternalID 6260310 attribute is a PartyInternalID 6260314 datatype. The InternalID 6260310 attribute has a cardinality of one 6260312 meaning that for each instance of the GoodsRecipientParty 6260306 entity there is one InternalID 6260310 attribute.

The FormattedName 6260316 attribute is a LONG_Name, Qualifier:PartyFormatted 6260320 datatype. The FormattedName 6260316 attribute has a cardinality of zero or one 6260318 meaning that for each instance of the GoodsRecipientParty 6260306 entity there may be one FormattedName 6260316 attribute.

The BillToParty 6260322 entity has a cardinality of zero or one 6260324 meaning that for each instance of the Item 6260248 entity there may be one BillToParty 6260322 entity. The BillToParty 6260322 entity includes various attributes, namely InternalID 6260326 and FormattedName 6260332.

The InternalID 6260326 attribute is a PartyInternalID 6260330 datatype. The InternalID 6260326 attribute has a cardinality of one 6260328 meaning that for each instance of the BillToParty 6260322 entity there is one InternalID 6260326 attribute.

The FormattedName 6260332 attribute is a LONG_Name, Qualifier:PartyFormatted 6260336 datatype. The FormattedName 6260332 attribute has a cardinality of zero or one 6260334 meaning that for each instance of the BillToParty 6260322 entity there may be one FormattedName 6260332 attribute.

The PayerParty 6260338 entity has a cardinality of zero or one 6260340 meaning that for each instance of the Item 6260248 entity there may be one PayerParty 6260338 entity. The PayerParty 6260338 entity includes various attributes, namely InternalID 6260342 and FormattedName 6260348.

The InternalID 6260342 attribute is a PartyInternalID 6260346 datatype. The InternalID 6260342 attribute has a cardinality of one 6260344 meaning that for each instance of the PayerParty 6260338 entity there is one InternalID 6260342 attribute.

The FormattedName 6260348 attribute is a LONG_Name, Qualifier:PartyFormatted 6260352 datatype. The FormattedName 6260348 attribute has a cardinality of zero or one 6260350 meaning that for each instance of the PayerParty 6260338 entity there may be one FormattedName 6260348 attribute.

The ResponsibleEmployeeParty 6260354 entity has a cardinality of zero or one 6260356 meaning that for each instance of the Item 6260248 entity there may be one ResponsibleEmployeeParty 6260354 entity. The ResponsibleEmployeeParty 6260354 entity includes various attributes, namely InternalID 6260358 and FormattedName 6260364.

The InternalID 6260358 attribute is a PartyInternalID 6260362 datatype. The InternalID 6260358 attribute has a cardinality of one 6260360 meaning that for each instance of the ResponsibleEmployeeParty 6260354 entity there is one InternalID 6260358 attribute.

The FormattedName 6260364 attribute is a LANGUAGE-INDEPENDENT_LONG_Name,Qualifier:PersonFormatted 6260368 datatype. The FormattedName 6260364 attribute has a cardinality of zero or one 6260366 meaning that for each instance of the ResponsibleEmployeeParty 6260354 entity there may be one FormattedName 6260364 attribute.

The SalesOrganisationParty 6260370 entity has a cardinality of zero or one 6260372 meaning that for each instance of the Item 6260248 entity there may be one SalesOrganisationParty 6260370 entity. The SalesOrganisationParty 6260370 entity includes an InternalID 6260374 attribute.

The InternalID 6260374 attribute is a PartyInternalID 6260378 datatype. The InternalID 6260374 attribute has a cardinality of one 6260376 meaning that for each instance of the SalesOrganisationParty 6260370 entity there is one InternalID 6260374 attribute.

The Location 6260380 package includes a ShipToLocation 6260382 entity.

The ShipToLocation 6260382 entity has a cardinality of zero or one 6260384 meaning that for each instance of the Item 6260248 entity there may be one ShipToLocation 6260382 entity. The ShipToLocation 6260382 entity includes a BuyerID 6260386 attribute.

The BuyerID 6260386 attribute is a LocationPartyID 6260390 datatype. The BuyerID 6260386 attribute has a cardinality of zero or one 6260388 meaning that for each instance of the ShipToLocation 6260382 entity there may be one BuyerID 6260386 attribute.

The SalesTerms 6260392 package includes a SalesTerms 6260394 entity.

The SalesTerms 6260394 entity has a cardinality of zero or one 6260396 meaning that for each instance of the Item 6260248 entity there may be one SalesTerms 6260394 entity. The SalesTerms 6260394 entity includes various attributes, namely DistributionChannelCode 6260398 and DivisionCode 6260404.

The DistributionChannelCode 6260398 attribute is a DistributionChannelCode 6260402 datatype. The DistributionChannelCode 6260398 attribute has a cardinality of one

6260400 meaning that for each instance of the SalesTerms 6260394 entity there is one DistributionChannelCode 6260398 attribute.

The DivisionCode 6260404 attribute is a DivisionCode 6260408 datatype. The DivisionCode 6260404 attribute has a cardinality of one 6260406 meaning that for each instance of the SalesTerms 6260394 entity there is one DivisionCode 6260404 attribute.

The DeliveryTerms 6260410 package includes a DeliveryTerms 6260412 entity.

The DeliveryTerms 6260412 entity has a cardinality of zero or one 6260414 meaning that for each instance of the Item 6260248 entity there may be one DeliveryTerms 6260412 entity. The DeliveryTerms 6260412 entity includes various attributes, namely PriorityValue 6260416 and Incoterms 6260422.

The PriorityValue 6260416 attribute is a PriorityValue 6260420 datatype. The PriorityValue 6260416 attribute has a cardinality of zero or one 6260418 meaning that for each instance of the DeliveryTerms 6260412 entity there may be one PriorityValue 6260416 attribute.

The Incoterms 6260422 attribute is an Incoterms 6260426 datatype. The Incoterms 6260422 attribute has a cardinality of zero or one 6260424 meaning that for each instance of the DeliveryTerms 6260412 entity there may be one Incoterms 6260422 attribute.

The InvoiceTerms 6260428 package includes an InvoiceTerms 6260430 entity.

The InvoiceTerms 6260430 entity has a cardinality of zero or one 6260432 meaning that for each instance of the Item 6260248 entity there may be one InvoiceTerms 6260430 entity. The InvoiceTerms 6260430 entity includes an InvoiceDate 6260434 attribute.

The InvoiceDate 6260434 attribute is a Date 6260438 datatype. The InvoiceDate 6260434 attribute has a cardinality of zero or one 6260436 meaning that for each instance of the InvoiceTerms 6260430 entity there may be one InvoiceDate 6260434 attribute.

The TotalValues 6260440 package includes a TotalValues 6260442 entity.

The TotalValues 6260442 entity has a cardinality of zero or one 6260444 meaning that for each instance of the Item 6260248 entity there may be one TotalValues 6260442 entity. The TotalValues 6260442 entity includes various attributes, namely RequestedQuantity 6260446, ConfirmedQuantity 6260452, GrossWeightMeasure 6260458, NetWeightMeasure 6260464, VolumeMeasure 6260470, NetAmount 6260476 and NetPrice 6260482.

The RequestedQuantity 6260446 attribute is a Quantity 6260450 datatype. The RequestedQuantity 6260446 attribute has a cardinality of zero or one 6260448 meaning that for each instance of the TotalValues 6260442 entity there may be one RequestedQuantity 6260446 attribute.

The ConfirmedQuantity 6260452 attribute is a Quantity 6260456 datatype. The ConfirmedQuantity 6260452 attribute has a cardinality of zero or one 6260454 meaning that for each instance of the TotalValues 6260442 entity there may be one ConfirmedQuantity 6260452 attribute.

The GrossWeightMeasure 6260458 attribute is a Measure 6260462 datatype. The GrossWeightMeasure 6260458 attribute has a cardinality of zero or one 6260460 meaning that for each instance of the TotalValues 6260442 entity there may be one GrossWeightMeasure 6260458 attribute.

The NetWeightMeasure 6260464 attribute is a Measure 6260468 datatype. The NetWeightMeasure 6260464 attribute has a cardinality of zero or one 6260466 meaning that for each instance of the TotalValues 6260442 entity there may be one NetWeightMeasure 6260464 attribute.

The VolumeMeasure 6260470 attribute is a Measure 6260474 datatype. The VolumeMeasure 6260470 attribute has a cardinality of zero or one 6260472 meaning that for each instance of the TotalValues 6260442 entity there may be one VolumeMeasure 6260470 attribute.

The NetAmount 6260476 attribute is an Amount 6260480 datatype. The NetAmount 6260476 attribute has a cardinality of zero or one 6260478 meaning that for each instance of the TotalValues 6260442 entity there may be one NetAmount 6260476 attribute.

The NetPrice 6260482 attribute is a Price 6260486 datatype. The NetPrice 6260482 attribute has a cardinality of zero or one 6260484 meaning that for each instance of the TotalValues 6260442 entity there may be one NetPrice 6260482 attribute.

The ScheduleLine 6260488 package includes a ScheduleLine 6260490 entity.

The ScheduleLine 6260490 entity has a cardinality of zero to n 6260492 meaning that for each instance of the Item 6260248 entity there may be zero or more ScheduleLine 6260490 entities. The ScheduleLine 6260490 entity includes various attributes, namely ID 6260494, Date 6260500, RequestedQuantity 6260506, ConfirmedQuantity 6260512, DeliveryBlockingReasonCode 6260518 and ReceiptTime 6260524.

The ID 6260494 attribute is a BusinessTransactionDocumentItemScheduleLineID 6260498 datatype. The ID 6260494 attribute has a cardinality of one 6260496 meaning that for each instance of the ScheduleLine 6260490 entity there is one ID 6260494 attribute.

The Date 6260500 attribute is a Date 6260504 datatype. The Date 6260500 attribute has a cardinality of zero or one 6260502 meaning that for each instance of the ScheduleLine 6260490 entity there may be one Date 6260500 attribute.

The RequestedQuantity 6260506 attribute is a Quantity 6260510 datatype. The RequestedQuantity 6260506 attribute has a cardinality of zero or one 6260508 meaning that for each instance of the ScheduleLine 6260490 entity there may be one RequestedQuantity 6260506 attribute.

The ConfirmedQuantity 6260512 attribute is a Quantity 6260516 datatype. The ConfirmedQuantity 6260512 attribute has a cardinality of zero or one 6260514 meaning that for each instance of the ScheduleLine 6260490 entity there may be one ConfirmedQuantity 6260512 attribute.

The DeliveryBlockingReasonCode 6260518 attribute is a BlockingReasonCode 6260522 datatype. The DeliveryBlockingReasonCode 6260518 attribute has a cardinality of zero or one 6260520 meaning that for each instance of the ScheduleLine 6260490 entity there may be one DeliveryBlockingReasonCode 6260518 attribute.

The ReceiptTime 6260524 attribute is a Time 6260528 datatype. The ReceiptTime 6260524 attribute has a cardinality of zero or one 6260526 meaning that for each instance of the ScheduleLine 6260490 entity there may be one ReceiptTime 6260524 attribute.

The Log 6260530 package is a Log 6260536 datatype. The Log 6260530 package includes a Log 6260532 entity.

The Log 6260532 entity has a cardinality of one 6260534 meaning that for each instance of the SalesOrderMessage 626002 entity there is one Log 6260532 entity.

SalesOrder Package

The SalesOrder package groups the SalesOrder with its packages.

SalesOrder

A SalesOrder is an agreement between a seller and a customer regarding the sale and delivery of goods associated with this at a certain time, for a certain quantity and at a certain price. The SalesOrder includes information that applies to the entire SalesOrder. The SalesOrder can include the parties involved, the sales/delivery/invoicing-specific agreements, status and references. The Sales order can include SalesOrderItems with the item information and dependent data such as the product information, the parties involved, the sales/delivery/invoicing-specific agreements, status and references.

ID is a unique identifier of a SalesOrder. Date, which can be optional, is a date at which a SalesOrder becomes effective from a business perspective. ProcessingTypeCode is an Encoded representation of a SalesOrder within the Sales Order Processing. ProcessingTypeName, which can be optional, is a name for the ProcessingTypeCode. BuyerID, which can be optional, is a unique identifier assigned by the buyer for a SalesOrder. DeliveryBlockingReasonCode, which can be optional, is the coded representation for the reason why a SalesOrder is blocked for delivery. The InvoiceBlockingReasonCode, which can be optional, is the coded representation for the reason why a SalesOrder is blocked for invoicing.

Party Package

A Party package groups together all the business parties involved in the SalesOrder.

BuyerParty

A BuyerParty is a party that purchases goods. InternalID is a proprietary identifier for a party. FormattedName, which can be optional, is a formatted name of a party.

GoodsRecipientParty

A GoodsRecipientParty is a party for which goods are delivered. InternalID, which can be optional, is a proprietary identifier for a party. FormattedName, which can be optional, is a formatted name of a party.

BillToParty

A BillToParty is a party that receives the invoice for goods. InternalID, which can be optional, is a proprietary identifier for a party. FormattedName, which can be optional, is a formatted name of a party.

PayerParty

A PayerParty is a party that pays for goods. InternalID, which can be optional, is a proprietary identifier for a party. FormattedName, which can be optional, is a formatted name of a party.

ResponsibleEmployeeParty

A ResponsibleEmployeeParty is an Employee of the sales party that is responsible for handling sales. InternalID, which can be optional, is a proprietary identifier for a party. FormattedName, which can be optional, is a formatted name of a party.

SalesOrganisationParty

A SalesOrganisationParty is a party that is responsible for selling goods. InternalID is a proprietary identifier for a party. FormattedName, which can be optional, is a formatted name of a party.

SalesOfficeParty

A SalesOfficeParty is a party that is responsible for selling goods within a given geographical area. InternalID, which can be optional, is a proprietary identifier for a party. FormattedName, which can be optional, is a formatted name of a party.

SalesGroupParty

A SalesGroupParty is a party that identifies a group of sales people responsible for processing sales of certain products. InternalID, which can be optional, is a proprietary identifier for a party. FormattedName, which can be optional, is a formatted name of a party.

SalesTerms Package

A SalesTerms package groups the sales terms of a SalesOrder.

SalesTerms

SalesTerms are agreements and conditions that apply for selling goods in the SalesOrder. DistributionChannelCode is an encoded representation of a distribution channel via which the goods or services are made available to the customer. DistributionChannelName, which can be optional, is a name of a DistributionChannel. DivisionCode is an encoded representation of a division that defines the responsibility for sales or profit for saleable materials or services. DivisionName, which can be optional, is a name of a Division.

DateTerms Package

A DateTerms package groups the date terms of a SalesOrder.

DateTerms

DateTerms are agreements regarding dates and durations for goods that can occur in a SalesOrder document. RequestDate is a time point at which a product is requested to be delivered.

PricingTerms Package

A PricingTerms package groups the information required for pricing a SalesOrder.

PricingTerms

PricingTerms are the characteristics used for pricing and value dating goods in the SalesOrder document. CurrencyCode is a currency for value dating the ordered goods and services (document currency). PriceDeterminationDate, which can be optional, is a pricing date on which prices are determined with a rule for automatic scheduling.

TotalValues Package

A TotalValues package groups the cumulated total values of a SalesOrder.

TotalValues

TotalValues are the total values that occur in a SalesOrder, for example, the total gross and net weight, volume, gross and net amount, tax amount, and freight costs. GrossWeightMeasure, which can be optional, is the total gross weight of the SalesOrder. NetAmount, which can be optional, is the total net amount of the SalesOrder.

DeliveryTerms Package

A DeliveryTerms package groups the delivery agreements for a SalesOrder.

DeliveryTerms

DeliveryTerms are the agreements that apply for delivering goods in the SalesOrder. An Incoterm, which can be optional, is a typical contract formulation for delivery conditions that correspond to the rules defined by the International Chamber of Commerce (ICC). A PartialDeliveryControlCode, which can be optional, is the coded representation of the partial delivery control. A partial delivery control specifies whether and in which form a customer allows partial deliveries.

InvoiceTerms Package

An InvoiceTerms package groups the invoice agreements for a SalesOrder. It contains the entity InvoiceTerms.

InvoiceTerms

InvoiceTerms are the agreements that apply for invoicing goods in the SalesOrder. An Invoicing Date, which can be optional, is the date at which the process of issuing invoices is supposed to be started.

Item Package

The Item package groups the SalesOrderItem with its packages.

Item

An Item is the item in a SalesOrder that focuses on the delivery of goods, the prices and the preparatory steps for invoicing. Item is the identifying and administrative item information in a SalesOrder which contains all the data that applies to the item, for example, the product information, the parties involved, the sales/delivery/invoicing-specific agreements, status and references, and so on.

ID is a unique identifier for an item in the SalesOrder. Description, which can be optional, is a description of an item in the SalesOrder. A CancellationReasonCode, which can be optional, is a coded representation for the reason for a cancellation. The InvoiceBlockingReasonCode, which can be optional, is the coded representation for the reason why a SalesOrderItem is blocked for invoicing.

ProductInformation Package

A ProductInformation package groups the product information of a SalesOrderItem.

Product

Product is the identification, description and classification of the product in a SalesOrderItem. A SellerID is an identifier for a product assigned by the seller.

TotalValues Package

A TotalValues package groups the total values information of a SalesOrderItem.

TotalValues

TotalValues are the total values of an item that result from dependent nodes of the item, for example the entire desired delivery quantity or confirmed quantity, the item-specific gross and net weight, volume, gross and net amount. RequestedQuantity, which can be optional, is a quantity that is requested for an item in a SalesOrder. ConfirmedQuantity, which can be optional, is a quantity that is confirmed for an item in a SalesOrder. GrossWeightMeasure, which can be optional, is the gross weight of the product in an item in a SalesOrder. NetWeightMeasure, which can be optional, is a net weight of the product in an item in a SalesOrder. VolumeMeasure, which can be optional, is a volume of the product in an item in a SalesOrder. NetAmount is a net amount of an item in a SalesOrder. NetPrice, which can be optional, is a net price of a SalesOrderItem product referred to a base quantity.

DeliveryTerms Package

A DeliveryTerms package groups the delivery agreement information for a SalesOrderItem.

DeliveryTerms

DeliveryTerms are the item-specific agreements that apply for delivering goods in the SalesOrder document. PriorityValue, which can be optional, is the priority/urgency of the delivery off a SalesOrderItem. An Incoterm, which can be optional, is a typical contract formulations for delivery conditions that correspond to rules defined by the International Chamber of Commerce (ICC).

Party Package

A Party package groups together all the business parties involved in the SalesOrderItem.

It contains the entities: BuyerParty, GoodsRecipientParty, BillToParty, PayerParty, ResponsibleEmployeeParty, and SalesOrganisationParty.

BuyerParty

A BuyerParty is a party that purchases goods. InternalID, which can be optional, is a proprietary identifier for a party. FormattedName, which can be optional, is a formatted name of a party:

GoodsRecipientParty

A GoodsRecipientParty is a party for which goods are delivered. InternalID, which can be optional, is a proprietary identifier for a party. FormattedName, which can be optional, is a formatted name of a party:

BillToParty

A BillToParty is a party that receives the invoice for goods. InternalID, which can be optional, is a proprietary identifier for a party. FormattedName, which can be optional, is a formatted name of a party:

PayerParty

A PayerParty is a party that pays for goods. InternalID, which can be optional, is a proprietary identifier for a party. FormattedName, which can be optional, is a formatted name of a party:

ResponsibleEmployeeParty

A ResponsibleEmployeeParty is an Employee of the sales party that is responsible for handling sales. InternalID, which can be optional, is a proprietary identifier for a party. FormattedName, which can be optional, which can be optional, is a formatted name of a party:

SalesOrganisationParty

A SalesOrganisationParty is a party that is responsible for selling goods. InternalID is a proprietary identifier for a party.

Location Package

The Location package groups together all participating locations for a SalesOrderItem.

ShipToLocation

A ShipToLocation is a location to which goods are shipped. BuyerID, which can be optional, is the identifier for a ShipToLocation assigned by the buyer party.

SalesTerms Package

A SalesTerms package groups the sales terms of a SalesOrderItem.

SalesTerms

SalesTerms are agreements and conditions that apply for selling goods in the SalesOrderItem. DistributionChannelCode, which can be optional, is an encoded representation of a distribution channel via which the goods or services are made available to the customer. DivisionCode, which can be optional, is an encoded representation of a division that defines the responsibility for sales or profit for saleable materials or services.

InvoiceTerms Package

An InvoiceTerms package groups the invoice agreements for a SalesOrderItem.

InvoiceTerms

InvoiceTerms are the agreements that apply for invoicing goods in the SalesOrderItem. An Invoicing Date, which can be optional, is the date at which the process of issuing invoices is supposed to be started.

AccountAssignment Package

The AccountAssignment Package groups together all accounting information.

AccountAssignment

AccountAssignment is the assignment of a set of accounting objects to a SalesOrderItem. ProjectWorkBreakdownStructureElementID is the unique identifier of a WBSElement.

ScheduleLine Package

A ScheduleLine package groups the information scheduled for a SalesOrderItem.

ScheduleLine

A ScheduleLine is the agreement that specifies when and in what quantity products of an item are requested or provided. ID is the unique identifier for a ScheduleLine in the SalesOrderItem. Date, which can be optional, is a date of a Schedule- Line. RequestedQuantity, which can be optional, is a quantity that is requested for a ScheduleLine. ConfirmedQuantity, which can be optional, is a quantity that is confirmed for a ScheduleLine. DeliveryBlockingReasonCode, which can be optional, is a coded representation for the reason why the delivery of a SalesOrderItemScheduleLine is blocked. ReceiptTime, which can be optional, is a time point at which something is received.

Log-Package

A Log package groups the messages used for user interaction.

Log

A log is a sequence of messages that result when an application executes a task.

Message Data Type

The message data type SalesOrderItemByIDQueryMessage_sync contains the selection included in the business document. It contains the package Selection.

FIG. 622 shows a SalesOrderItemByIDQueryMessage_sync 622000 package. The SalesOrderItemByIDQueryMessage_sync 622000 package is a SalesOrderItemByIDQueryMessage_sync 622004 datatype. The SalesOrderItemByIDQueryMessage_sync 622000 package includes a SalesOrderItemByIDQueryMessage_sync 622002 entity. The SalesOrderItemByIDQueryMessage_sync 622000 package includes a Selection 622020 package.

The Selection 622020 package includes a SalesOrderItemSelectionByID 622022 entity.

The SalesOrderItemSelectionByID 622022 entity has a cardinality of one 622024 meaning that for each instance of the SalesOrderItemByIDQueryMessage_sync 622002 entity there is one SalesOrderItemSelectionByID 622022 entity. The SalesOrderItemSelectionByID 622022 entity includes various attributes, namely SalesOrderID 622026 and SalesOrderItemID 622032.

The SalesOrderID 622026 attribute is a SalesOrderID 622030 datatype. The SalesOrderID 622026 attribute has a cardinality of one 622028 meaning that for each instance of the SalesOrderItemSelectionByID 622022 entity there is one SalesOrderID 622026 attribute.

The SalesOrderItemID 622032 attribute is a SalesOrderItemID 622036 datatype. The SalesOrderItemID 622032 attribute has a cardinality of one 622034 meaning that for each instance of the SalesOrderItemSelectionByID 622022 entity there is one SalesOrderItemID 622032 attribute.

Selection Package

The selection package contains the ID and the ItemID for a SalesOrder. It contains the entity SalesOrderItemSelectionByID.

SalesOrderItemSelectionByID

SalesOrderItemSelectionByID specifies the criteria to select a SalesOrderItem by SalesOrderID and SalesOrderItemID. SalesOrderID is a unique identifier for a SalesOrder. SalesOrderItemID is a unique identifier for an item in the SalesOrder.

Message Data Type

The Message Data Type SalesOrderBasicDataByBuyerAndDeliveryBlockedQueryMessage_sync contains the selection included in the business document. FIG. 608 shows a SalesOrderBasicDataByBuyerAndDeliveryBlockQueryMessage_sync 608000 package. The SalesOrderBasicDataByBuyerAndDeliveryBlockQueryMessage_sync 608000 package is a SalesOrderBasicDataByBuyerAndDeliveryBlockedQueryMessage_sync 608004 datatype. The SalesOrderBasicDataByBuyerAndDeliveryBlockQueryMessage_sync 608000 package includes a Sales OrderBasicDataByBuyerAndDeliveryBlockedQueryMessage_sync 608002 entity. The SalesOrderBasicDataByBuyerAndDeliveryBlockQueryMessage_sync 608000 package includes a Selection 608020 package.

The Selection 608020 package includes a SalesOrderBasicDataSelectionByBuyerAndDeliveryBlocked 608022 entity.

The SalesOrderBasicDataSelectionByBuyerAndDeliveryBlocked 608022 entity has a cardinality of one 608024 meaning that for each instance of the SalesOrderBasicDataByBuyerAndDeliveryBlockedQueryMessage_sync 608002 entity there is one SalesOrderBasicDataSelectionByBuyerAndDeliveryBlocked 608022 entity. The SalesOrderBasicDataSelectionByBuyerAndDeliveryBlocked 608022 entity includes a SalesOrderBuyerPartyInternalID 608026 attribute.

The SalesOrderBuyerPartyInternalID 608026 attribute is a PartyInternalID 608030 datatype. The SalesOrderBuyerPartyInternalID 608026 attribute has a cardinality of one 608028 meaning that for each instance of the SalesOrderBasicDataSelectionByBuyerAndDeliveryBlocked 608022 entity there is one SalesOrderBuyerPartyInternalID 608026 attribute.

Selection Package

The selection package contains the selection criteria for a SalesOrder.

SalesOrderBasicDataSelectionByBuyerAndDeliveryBlocked

SalesOrderBasicDataSelectionByBuyerAndDeliveryBlocked specifies the criteria to select SalesOrders. SalesOrderBuyerPartyInternalID is a proprietary identifier for a party.

Message Data Type

The message data type SalesOrderByIDQueryMessage_sync contains the selection included in the business document. FIG. 614 shows a SalesOrderByIdQueryMessage_sync 614000 package. The SalesOrderByIdQueryMessage_sync 614000 package is a SalesOrderByIDQueryMessage_sync 614004 datatype. The SalesOrderByIdQueryMessage_sync 614000 package includes a SalesOrderByIdQueryMessage_sync 614002 entity. The SalesOrderByIdQueryMessage_sync 614000 package includes a Selection 614020 package.

The Selection 614020 package includes a SalesOrderSelectionByID 614022 entity.

The SalesOrderSelectionByID 614022 entity has a cardinality of one 614024 meaning that for each instance of the SalesOrderByIdQueryMessage_sync 614002 entity there is one SalesOrderSelectionByID 614022 entity. The SalesOrderSelectionByID 614022 entity includes an ID 614026 attribute.

The ID 614026 attribute is a SalesOrderID 614030 datatype. The ID 614026 attribute has a cardinality of one 614028 meaning that for each instance of the SalesOrderSelectionByID 614022 entity there is one ID 614026 attribute.

Selection Package

The selection package contains the selection criteria for a SalesOrder. It contains the entity SalesOrderSelectionByID.

SalesOrderSelectionByID

SalesOrderSelectionByID specifies the criteria to select a SalesOrder. SalesOrderID is a unique identifier for a SalesOrder.

Message Data Type

The message data type SalesOrderItemByBuyerAndProductQueryMessage_sync contains the selection included in the business document. It contains the package Selection.

FIGS. 620-1 through 620-2 show a SalesOrderItemByBuyerAndProductQueryMessage_sync 620000 package. The SalesOrderItemByBuyerAndProductQueryMessage_sync 620000 package is a SalesOrderItemByBuyerAndProductQueryMessage_sync 620004 datatype. The SalesOrderItemByBuyerAndProductQueryMessage_sync 620000 package includes a SalesOrderItemByBuyerAndProductQueryMessage_sync 620002 entity. The SalesOrderItemByBuyerAndProductQueryMessage_sync 620000 package includes a Selection 620020 package.

The Selection 620020 package includes a SalesOrderItemSelectionByBuyerAndProduct 620022 entity.

The SalesOrderItemSelectionByBuyerAndProduct 620022 entity has a cardinality of one 620024 meaning that for each instance of the SalesOrderItemByBuyerAndProductQueryMessage_sync 620002 entity there is one SalesOrderItemSelectionByBuyerAndProduct 620022 entity. The SalesOrderItemSelectionByBuyerAndProduct 620022 entity includes various attributes, namely SalesOrderBuyerPartyInternalID 620026, SalesOrderSalesOrganisationPartyInternalID 620032 and SalesOrderItemProductSellerID 620038.

The SalesOrderBuyerPartyInternalID 620026 attribute is a PartyInternalID 620030 datatype. The SalesOrderBuyerPartyInternalID 620026 attribute has a cardinality of one 620028 meaning that for each instance of the SalesOrderItemSelectionByBuyerAndProduct 620022 entity there is one SalesOrderBuyerPartyInternalID 620026 attribute.

The SalesOrderSalesOrganisationPartyInternalID 620032 attribute is a PartyInternalID 620036 datatype. The SalesOrderSalesOrganisationPartyInternalID 620032 attribute has a cardinality of one 620034 meaning that for each instance of the SalesOrderItemSelectionByBuyerAndProduct 620022 entity there is one SalesOrderSalesOrganisationPartyInternalID 620032 attribute.

The SalesOrderItemProductSellerID 620038 attribute is a ProductPartyID 620042 datatype. The SalesOrderItemProductSellerID 620038 attribute has a cardinality of one 620040 meaning that for each instance of the SalesOrderItemSelectionByBuyerAndProduct 620022 entity there is one SalesOrderItemProductSellerID 620038 attribute.

Selection Package

The selection package contains the selection criteria for a SalesOrderItem. It contains the entity SalesOrderItemSelectionByBuyerAndProduct.

SalesOrderItemSelectionByBuyerAndProduct

SalesOrderItemSelectionByBuyerAndProduct specifies the criteria to select a SalesOrderItem. SalesOrderBuyerPartyInternalID is a proprietary identifier for a party. SalesOrderSalesOrganisationPartyInternalID is an identifier that is assigned by the SellerParty for the SalesOrganisationParty. SalesOrderItemProductSellerID is an identifier for a Product assigned by the SellerParty.

Message Data Type

The message data type SalesOrderItemByAccountAssignmentQueryMessage_sync contains the selection included in the business document. It contains the package Selection.

FIG. 618 shows a SalesOrderItemByAccountAssignmentQueryMessage_sync 618000 package. The SalesOrderItemByAccountAssignmentQueryMessage_sync 618000 package is a SalesOrderItemByAccountAssignmentQueryMessage_sync 618004 datatype. The SalesOrderItemByAccountAssignmentQueryMessage_sync 618000 package includes a SalesOrderItemByAccountAssignmentQueryMessage_sync 618002 entity. The SalesOrderItemByAccountAssignmentQueryMessage_sync 618000 package includes a Selection 618020 package.

The Selection 618020 package includes a SalesOrderItemSelectionByAccountAssignment 618022 entity.

The SalesOrderItemSelectionByAccountAssignment 618022 entity has a cardinality of one 618024 meaning that for each instance of the SalesOrderItemByAccountAssignmentQueryMessage_sync 618002 entity there is one SalesOrderItemSelectionByAccountAssignment 618022 entity. The SalesOrderItemSelectionByAccountAssignment 618022 entity includes a SalesOrderItemAccountAssignmentProjectWorkBreakdownStructureElementID 618026 attribute.

The SalesOrderItemAccountAssignmentProjectWorkBreakdownStructureElementID 618026 attribute is a ProjectWorkBreakdownStructureElementID 618030 datatype. The SalesOrderItemAccountAssignmentProjectWorkBreakdownStructureElementID 618026 attribute has a cardinality of one 618028 meaning that for each instance of the SalesOrderItemSelectionByAccountAssignment 618022 entity there is one SalesOrderItemAccountAssignmentProjectWorkBreakdownStructureElementID 618026 attribute.

Selection Package

The selection package contains the selection criteria for a SalesOrderItem. It contains the entity SalesOrderItemSelectionByAccountAssignment.

SalesOrderItemSelectionByAccountAssignment

SalesOrderItemSelectionByAccountAssignment specifies the criteria to select SalesOrderItem. SalesOrderItemAccountAssignmentProjectWorkBreakdownStructureElementID is a unique identifier of a WBSElement.

Message Data Type

The message data type SalesOrderBasicDataByBuyerAndBasicDataQueryMessage_sync contains the selection included in the business document. FIGS. 604-1 through 604-2 show a SalesOrderBasicDataByBuyerAndBasicDataQueryMessage_sync 604000 package. The SalesOrderBasicDataByBuyerAndBasicDataQueryMessage_sync 604000 package is a SalesOrderBasicDataByBuyerAndBasicDataQueryMessage_sync 604004 datatype. The SalesOrderBasicDataByBuyerAndBasicDataQueryMessage_sync 604000 package includes a SalesOrderBasicDataByBuyerAndBasicDataQueryMessage_sync 604002 entity. The SalesOrderBasicDataByBuyerAndBasicDataQueryMessage_sync 604000 package includes a Selection 604006 package.

The Selection 604006 package includes a SalesOrderBasicDataSelectionByBuyerAndBasicData 604008 entity.

The SalesOrderBasicDataSelectionByBuyerAndBasicData 604008 entity has a cardinality of one 604010 meaning that for each instance of the SalesOrderBasicDataByBuyerAndBasicDataQueryMessage_sync 604002 entity there is one SalesOrderBasicDataSelectionByBuyerAndBasicData 604008 entity. The SalesOrderBasicDataSelectionByBuyerAndBasicData 604008 entity includes various attributes, namely SalesOrderBuyerPartyInternalID 604012, SalesOrderSalesOrganisationPartyInternalID 604018, SalesOrderSalesOfficePartyInternalID 604024, SalesOrderSalesGroupPartyInternalID 604030, SalesOrderProcessingTypeCode 604036, SalesOrderSalesTernsDistributionChannelCode 604042 and SalesOrderSalesTermsDivisionCode 604048.

The SalesOrderBuyerPartyInternalID 604012 attribute is a PartyInternalID 604016 datatype. The SalesOrderBuyerPartyInternalID 604012 attribute has a cardinality of one 604014 meaning that for each instance of the SalesOrderBasicDataSelectionByBuyerAndBasicData 604008 entity there is one SalesOrderBuyerPartyInternalID 604012 attribute.

The SalesOrderSalesOrganisationPartyInternalID 604018 attribute is a PartyInternalID 604022 datatype. The SalesOrderSalesOrganisationPartyInternalID 604018 attribute has a cardinality of zero or one 604020 meaning that for each instance of the SalesOrderBasicDataSelectionByBuyerAndBasicData 604008 entity there may be one SalesOrderSalesOrganisationPartyInternalID 604018 attribute.

The SalesOrderSalesOfficePartyInternalID 604024 attribute is a PartyInternalID 604028 datatype. The SalesOrderSalesOfficePartyInternalID 604024 attribute has a cardinality of zero or one 604026 meaning that for each instance of the SalesOrderBasicDataSelectionByBuyerAndBasicData 604008 entity there may be one SalesOrderSalesOfficePartyInternalID 604024 attribute.

The SalesOrderSalesGroupPartyInternalID 604030 attribute is a PartyInternalID 604034 datatype. The SalesOrderSalesGroupPartyInternalID 604030 attribute has a cardinality of zero or one 604032 meaning that for each instance of the SalesOrderBasicDataSelectionByBuyerAndBasicData 604008 entity there may be one SalesOrderSalesGroupPartyInternalID 604030 attribute.

The SalesOrderProcessingTypeCode 604036 attribute is a BusinessTransactionDocumentProcessingTypeCode 604040 datatype. The SalesOrderProcessingTypeCode 604036 attribute has a cardinality of zero or one 604038 meaning that for each instance of the SalesOrderBasicDataSelectionByBuyerAndBasicData 604008 entity there may be one SalesOrderProcessingTypeCode 604036 attribute.

The SalesOrderSalesTermsDistributionChannelCode 604042 attribute is a DistributionChannelCode 604046 datatype. The SalesOrderSalesTermsDistributionChannelCode 604042 attribute has a cardinality of zero or one 604044 meaning that for each instance of the SalesOrderBasicDataSelectionByBuyerAndBasicData 604008 entity there may be one SalesOrderSalesTermsDistributionChannelCode 604042 attribute.

The SalesOrderSalesTermsDivisionCode 604048 attribute is a DivisionCode 604052 datatype. The SalesOrderSalesTermsDivisionCode 604048 attribute has a cardinality of zero or one 604050 meaning that for each instance of the SalesOrderBasicDataSelectionByBuyerAndBasicData 604008 entity there may be one SalesOrderSalesTermsDivisionCode 604048 attribute.

Selection Package

The selection package contains the selection criteria for a SalesOrder. It contains the entity SalesOrderBasicDataSelectionByBuyerAndBasicData.

SalesOrderBasicDataSelectionByBuyerAndBasicData

SalesOrderBasicDataSelectionByBuyerAndBasicData specifies the criteria to select SalesOrders. SalesOrderBuyerPartyInternalID is a proprietary identifier for a party. SalesOrderSalesOrganisationPartyInternalID, which can be optional, is an identifier that is assigned by the SellerParty for the SalesOrganisationParty. SalesOrderSalesOfficePartyInternalID, which can be optional, is a proprietary identifier for a party. SalesOrderSalesGroupPartyInternalID, which can be optional, is a proprietary identifier for a party. SalesOrderProcessingTypeCode, which can be optional, is a coded representation of a SalesOrder within the Sales Order-Processing. SalesOrderSalesTermsDistributionChannelCode, which can be optional, is a coded representation of a distribution channel via which the goods or services are made available to the customer. SalesOrderSalesTermsDivisionCode, which can be optional, is a coded representation of a division that defines the responsibility for sales or profit for saleable materials or services.

Message Data Type

The Message Data Type SalesOrderBasicDataByBuyerAndIncompletenessQueryMessage_sync contains the selection included in the business document. FIG. 610 shows a SalesOrderBasicDataByBuyerAndIncompletenessQueryMessage_sync 610000 package. The SalesOrderBasicDataByBuyerAndIncompletenessQueryMessage_sync 610000 package is a SalesOrderBasicDataByBuyerAndIncompletenessQueryMessage_sync 610004 datatype. The SalesOrderBasicDataByBuyerAndIncompletenessQueryMessage_sync 610000 package includes a SalesOrderBasicDataByBuyerAndIncompletenessQueryMessage_sync 610002 entity. The SalesOrderBasicDataByBuyerAndIncompletenessQueryMessage_sync 610000 package includes a Selection 610006 package.

The Selection 610006 package includes a SalesOrderBasicDataSelectionByBuyerAndBasicData 610008 entity.

The SalesOrderBasicDataSelectionByBuyerAndBasicData 610008 entity has a cardinality of one 610010 meaning that for each instance of the SalesOrderBasicDataByBuyerAndIncompletenessQueryMessage_sync 610002 entity there is one SalesOrderBasicDataSelectionByBuyerAndBasicData 610008 entity. The SalesOrderBasicDataSelectionByBuyerAndBasicData 610008 entity includes a SalesOrderBuyerPartyInternalID 610012 attribute.

The SalesOrderBuyerPartyInternalID 610012 attribute is a PartyInternalID 610016 datatype. The SalesOrderBuyerPartyInternalID 610012 attribute has a cardinality of one 610014 meaning that for each instance of the SalesOrderBasicDataSelectionByBuyerAndBasicData 610008 entity there is one SalesOrderBuyerPartyInternalID 610012 attribute.

Selection Package

The selection package contains the selection criteria for a SalesOrder. It contains the entity SalesOrderBasicDataSelectionByBuyerAndIncompleteness.

SalesOrderBasicDataSelectionByBuyerAndIncompleteness

SalesOrderBasicDataSelectionByBuyerAndIncompleteness specifies the criteria to select SalesOrders. SalesOrderBuyerPartyInternalID is a proprietary identifier for a party.

Message Data Type

The Message Data Type SalesOrderBasicDataByBuyerAndInvoicingBlockedQueryMessage_sync contains the selection included in the business document. FIG. 612 shows a SalesOrderBasicDataByBuyerAndInvoicingBlockedQueryMessage_sync 612000 package. The SalesOrderBasicDataByBuyerAndInvoicingBlockedQueryMessage_sync 612000 package is a SalesOrderBasicDataByBuyerAndInvoicingBlockedQueryMessage_sync 612004 datatype. The SalesOrderBasicDataByBuyerAndInvoicingBlockedQueryMessage_sync 612000 package includes a SalesOrderBasicDataByBuyerAndInvoicingBlockedQueryMessage_sync 612002 entity. The SalesOrderBasicDataByBuyerAndInvoicingBlockedQueryMessage_sync 612000 package includes a Selection 612006 package.

The Selection 612006 package includes a SalesOrderBasicDataSelectionByBuyerAndBasicData 612008 entity.

The SalesOrderBasicDataSelectionByBuyerAndBasicData 612008 entity has a cardinality of one 612010 meaning that for each instance of the SalesOrderBasicDataByBuyerAndInvoicingBlockedQueryMessage_sync 612002 entity there is one SalesOrderBasicDataSelectionByBuyerAndBasicData 612008 entity. The SalesOrderBasicDataSelectionByBuyerAndBasicData 612008 entity includes a SalesOrderBuyerPartyInternalID 612012 attribute.

The SalesOrderBuyerPartyInternalID 612012 attribute is a PartyInternalID 612016 datatype. The SalesOrderBuyerPartyInternalID 612012 attribute has a cardinality of one 612014 meaning that for each instance of the SalesOrderBasicDataSelectionByBuyerAndBasicData 612008 entity there is one SalesOrderBuyerPartyInternalID 612012 attribute.

Selection Package

The selection package contains the selection criteria for a SalesOrder. It contains the entity SalesOrderBasicDataSelectionByBuyerAndInvoicingBlocked.

SalesOrderBasicDataSelectionByBuyerAndInvoicingBlocked

SalesOrderBasicDataSelectionByBuyerAndInvoicingBlocked specifies the criteria to select SalesOrders. SalesOrderBuyerPartyInternalID is a proprietary identifier for a party.

Message Data Type

The Message Data Type SalesOrderBasicDataByBuyerAndCreditBlockedQueryMessage_sync contains the selection included in the business document. FIG. 606 shows a SalesOrderBasicDataByBuyerAndCreditBlockedQueryMessage_sync 606000 package. The SalesOrderBasicDataByBuyerAndCreditBlockedQueryMessage_sync 606000 package is a SalesOrderBasicDataByBuyerAndCreditBlockedQueryMessage_sync 606004 datatype. The SalesOrderBasicDataByBuyerAndCreditBlockedQueryMessage_sync 606000 package includes a SalesOrderBasicDataByBuyerAndCreditBlockedQueryMessage_sync 606002 entity. The SalesOrderBasicDataByBuyerAndCreditBlockedQueryMessage_sync 606000 package includes a Selection 606006 package.

The Selection 606006 package includes a SalesOrderBasicDataSelectionByBuyerAndCreditBlocked 606008 entity.

The SalesOrderBasicDataSelectionByBuyerAndCreditBlocked 606008 entity has a cardinality of one 606010 meaning that for each instance of the SalesOrderBasicDataByBuyerAndCreditBlockedQueryMessage_sync 606002 entity there is one SalesOrderBasicDataSelectionByBuyerAndCreditBlocked 606008 entity. The SalesOrderBasicDataSelectionByBuyerAndCreditBlocked 606008 entity includes a SalesOrderBuyerPartyInternalID 606012 attribute.

The SalesOrderBuyerPartyInternalID 606012 attribute is a PartyInternalID 606016 datatype. The SalesOrderBuyerPartyInternalID 606012 attribute has a cardinality of one 606014 meaning that for each instance of the SalesOrderBasicDataSelectionByBuyerAndCreditBlocked 606008 entity there is one SalesOrderBuyerPartyInternalID 606012 attribute.

Selection Package

The selection package contains the selection criteria for a SalesOrder. It contains the entity SalesOrderBasicDataSelectionByBuyerAndCreditBlocked.

SalesOrderBasicDataSelectionByBuyerAndCreditBlocked

SalesOrderBasicDataSelectionByBuyerAndCreditBlocked specifies the criteria to select SalesOrders. SalesOrderBuyerPartyInternalID is a proprietary identifier for a party.

Message Data Type

FIGS. 615-1 through 615-14 show a SalesOrderByIDResponseMessage_sync 615000 package. The SalesOrderByIDResponseMessage_sync 615000 package is a SalesOrderByIDResponseMessage_sync 615004 datatype. The SalesOrderByIDResponseMessage_sync 615000 package includes a SalesOrderByIDResponseMessage_sync 615002 entity. The SalesOrderByIDResponseMessage_sync 615000 package includes various packages, namely SalesOrder 615020 and Log 6150522.

The SalesOrder 615020 package includes a SalesOrder 615022 entity. The SalesOrder 615020 package includes various packages, namely Party 615062, SalesTerms 6150154, DateTerms 6150172, PricingTerms 6150184, TotalValues 6150202, DeliveryTerms 6150220, InvoiceTerms 6150238 and Item 6150250.

The SalesOrder 615022 entity has a cardinality of zero or one 615024 meaning that for each instance of the SalesOrderByIDResponseMessage_sync 615002 entity there may be one SalesOrder 615022 entity. The SalesOrder 615022 entity includes various attributes, namely ID 615026, Date 615032, ProcessingTypeCode 615038, BuyerID 615044, DeliveryBlockingReasonCode 615050 and InvoiceBlockingReasonCode 615056.

The ID 615026 attribute is a SalesOrderID 615030 datatype. The ID 615026 attribute has a cardinality of one 615028 meaning that for each instance of the SalesOrder 615022 entity there is one ID 615026 attribute.

The Date 615032 attribute is a Date 615036 datatype. The Date 615032 attribute has a cardinality of zero or one 615034 meaning that for each instance of the SalesOrder 615022 entity there may be one Date 615032 attribute.

The ProcessingTypeCode 615038 attribute is a BusinessTransactionDocumentProcessingTypeCode 615042 datatype. The ProcessingTypeCode 615038 attribute has a cardinality of zero or one 615040 meaning that for each instance of the SalesOrder 615022 entity there may be one ProcessingTypeCode 615038 attribute.

The BuyerID 615044 attribute is a BusinessTransactionDocumentID 615048 datatype. The BuyerID 615044 attribute has a cardinality of zero or one 615046 meaning that for each instance of the SalesOrder 615022 entity there may be one BuyerID 615044 attribute.

The DeliveryBlockingReasonCode 615050 attribute is a BlockingReasonCode 615054 datatype. The DeliveryBlockingReasonCode 615050 attribute has a cardinality of zero or one 615052 meaning that for each instance of the SalesOrder 615022 entity there may be one DeliveryBlockingReasonCode 615050 attribute.

The InvoiceBlockingReasonCode 615056 attribute is a BlockingReasonCode 615060 datatype. The InvoiceBlockingReasonCode 615056 attribute has a cardinality of zero or one 615058 meaning that for each instance of the SalesOrder 615022 entity there may be one InvoiceBlockingReasonCode 615056 attribute.

The Party 615062 package includes various entities, namely BuyerParty 615064, GoodsRecipientParty 615080, BillToParty 615096, PayerParty 6150112, ResponsibleEmployeeParty 6150128 and SalesOrganisationParty 6150144.

The BuyerParty 615064 entity has a cardinality of one 615066 meaning that for each instance of the SalesOrder 615022 entity there is one BuyerParty 615064 entity. The BuyerParty 615064 entity includes various attributes, namely InternalID 615068 and FormattedName 615074.

The InternalID 615068 attribute is a PartyInternalID 615072 datatype. The InternalID 615068 attribute has a cardinality of one 615070 meaning that for each instance of the BuyerParty 615064 entity there is one InternalID 615068 attribute.

The FormattedName 615074 attribute is a LONG_Name, Qualifier:PartyFormatted 615078 datatype. The FormattedName 615074 attribute has a cardinality of zero or one 615076 meaning that for each instance of the BuyerParty 615064 entity there may be one FormattedName 615074 attribute.

The GoodsRecipientParty 615080 entity has a cardinality of zero or one 615082 meaning that for each instance of the SalesOrder 615022 entity there may be one GoodsRecipientParty 615080 entity. The GoodsRecipientParty 615080 entity includes various attributes, namely InternalID 615084 and FormattedName 615090.

The InternalID 615084 attribute is a PartyInternalID 615088 datatype. The InternalID 615084 attribute has a cardinality of one 615086 meaning that for each instance of the GoodsRecipientParty 615080 entity there is one InternalID 615084 attribute.

The FormattedName 615090 attribute is a LONG_Name, Qualifier:PartyFormatted 615094 datatype. The FormattedName 615090 attribute has a cardinality of zero or one 615092 meaning that for each instance of the GoodsRecipientParty 615080 entity there may be one FormattedName 615090 attribute.

The BillToParty 615096 entity has a cardinality of zero or one 615098 meaning that for each instance of the SalesOrder 615022 entity there may be one BillToParty 615096 entity. The BillToParty 615096 entity includes various attributes, namely InternalID 6150100 and FormattedName 6150106.

The InternalID 6150100 attribute is a PartyInternalID 6150104 datatype. The InternalID 6150100 attribute has a cardinality of one 6150102 meaning that for each instance of the BillToParty 615096 entity there is one InternalID 6150100 attribute.

The FormattedName 6150106 attribute is a LONG_Name, Qualifier:PartyFormatted 6150110 datatype. The FormattedName 6150106 attribute has a cardinality of zero or one 6150108 meaning that for each instance of the BillToParty 615096 entity there may be one FormattedName 6150106 attribute.

The PayerParty 6150112 entity has a cardinality of zero or one 6150114 meaning that for each instance of the SalesOrder 615022 entity there may be one PayerParty 6150112 entity. The PayerParty 6150112 entity includes various attributes, namely InternalID 6150116 and FormattedName 6150122.

The InternalID 6150116 attribute is a PartyInternalID 6150120 datatype. The InternalID 6150116 attribute has a cardinality of one 6150118 meaning that for each instance of the PayerParty 6150112 entity there is one InternalID 6150116 attribute.

The FormattedName 6150122 attribute is a LONG_Name, Qualifier:PartyFormatted 6150126 datatype. The FormattedName 6150122 attribute has a cardinality of zero or one 6150124 meaning that for each instance of the PayerParty 6150112 entity there may be one FormattedName 6150122 attribute.

The ResponsibleEmployeeParty 6150128 entity has a cardinality of zero or one 6150130 meaning that for each instance of the SalesOrder 615022 entity there may be one ResponsibleEmployeeParty 6150128 entity. The ResponsibleEmployeeParty 6150128 entity includes various attributes, namely InternalID 6150132 and FormattedName 6150138.

The InternalID 6150132 attribute is a PartyInternalID 6150136 datatype. The InternalID 6150132 attribute has a cardinality of one 6150134 meaning that for each instance of the ResponsibleEmployeeParty 6150128 entity there is one InternalID 6150132 attribute.

The FormattedName 6150138 attribute is a LANGUAGE-INDEPENDENT_LONG_Name,Qualifier:PersonFormatted 6150142 datatype. The FormattedName 6150138 attribute has a cardinality of zero or one 6150140 meaning that for each instance of the ResponsibleEmployeeParty 6150128 entity there may be one FormattedName 6150138 attribute.

The SalesOrganisationParty 6150144 entity has a cardinality of one 6150146 meaning that for each instance of the SalesOrder 615022 entity there is one SalesOrganisationParty 6150144 entity. The SalesOrganisationParty 6150144 entity includes an InternalID 6150148 attribute.

The InternalID 6150148 attribute is a PartyInternalID 6150152 datatype. The InternalID 6150148 attribute has a cardinality of one 6150150 meaning that for each instance of the SalesOrganisationParty 6150144 entity there is one InternalID 6150148 attribute.

The SalesTerms 6150154 package includes a SalesTerms 6150156 entity.

The SalesTerms 6150156 entity has a cardinality of zero or one 6150158 meaning that for each instance of the SalesOrder 615022 entity there may be one SalesTerms 6150156 entity. The SalesTerms 6150156 entity includes various attributes, namely DistributionChannelCode 6150160 and DivisionCode 6150166.

The DistributionChannelCode 6150160 attribute is a DistributionChannelCode 6150164 datatype. The DistributionChannelCode 6150160 attribute has a cardinality of zero or one 6150162 meaning that for each instance of the SalesTerms 6150156 entity there may be one DistributionChannelCode 6150160 attribute.

The DivisionCode 6150166 attribute is a DivisionCode 6150170 datatype. The DivisionCode 6150166 attribute has a cardinality of zero or one 6150168 meaning that for each instance of the SalesTerms 6150156 entity there may be one DivisionCode 6150166 attribute.

The DateTerms 6150172 package includes a DateTerms 6150174 entity.

The DateTerms 6150174 entity has a cardinality of zero or one 6150176 meaning that for each instance of the SalesOrder 615022 entity there may be one DateTerms 6150174 entity. The DateTerms 6150174 entity includes a RequestDate 6150178 attribute.

The RequestDate 6150178 attribute is a Date 6150182 datatype. The RequestDate 6150178 attribute has a cardinality of zero or one 6150180 meaning that for each instance of the DateTerms 6150174 entity there may be one RequestDate 6150178 attribute.

The PricingTerms 6150184 package includes a PricingTerms 6150186 entity.

The PricingTerms 6150186 entity has a cardinality of zero or one 6150188 meaning that for each instance of the SalesOrder 615022 entity there may be one PricingTerms 6150186 entity. The PricingTerms 6150186 entity includes various attributes, namely CurrencyCode 6150190 and PriceDeterminationDate 6150196.

The CurrencyCode 6150190 attribute is a CurrencyCode 6150194 datatype. The CurrencyCode 6150190 attribute has a cardinality of zero or one 6150192 meaning that for each instance of the PricingTerms 6150186 entity there may be one CurrencyCode 6150190 attribute.

The PriceDeterminationDate 6150196 attribute is a Date 6150200 datatype. The PriceDeterminationDate 6150196 attribute has a cardinality of zero or one 6150198 meaning that for each instance of the PricingTerms 6150186 entity there may be one PriceDeterminationDate 6150196 attribute.

The TotalValues 6150202 package includes a TotalValues 6150204 entity.

The TotalValues 6150204 entity has a cardinality of zero or one 6150206 meaning that for each instance of the SalesOrder 615022 entity there may be one TotalValues 6150204 entity. The TotalValues 6150204 entity includes various attributes, namely GrossWeightMeasure 6150208 and NetAmount 6150214.

The GrossWeightMeasure 6150208 attribute is a Measure 6150212 datatype. The GrossWeightMeasure 6150208 attribute has a cardinality of zero or one 6150210 meaning that for each instance of the TotalValues 6150204 entity there may be one GrossWeightMeasure 6150208 attribute.

The NetAmount 6150214 attribute is an Amount 6150218 datatype. The NetAmount 6150214 attribute has a cardinality of zero or one 6150216 meaning that for each instance of the TotalValues 6150204 entity there may be one NetAmount 6150214 attribute.

The DeliveryTerms 6150220 package includes a DeliveryTerms 6150222 entity.

The DeliveryTerms 6150222 entity has a cardinality of zero or one 6150224 meaning that for each instance of the SalesOrder 615022 entity there may be one DeliveryTerms 6150222 entity. The DeliveryTerms 6150222 entity includes various attributes, namely Incoterms 6150226 and PartialDeliveryControlCode 6150232.

The Incoterms 6150226 attribute is an Incoterms 6150230 datatype. The Incoterms 6150226 attribute has a cardinality of zero or one 6150228 meaning that for each instance of the DeliveryTerms 6150222 entity there may be one Incoterms 6150226 attribute.

The PartialDeliveryControlCode 6150232 attribute is a PartialDeliveryControlCode 6150236 datatype. The PartialDeliveryControlCode 6150232 attribute has a cardinality of zero or one 6150234 meaning that for each instance of the DeliveryTerms 6150222 entity there may be one PartialDeliveryControlCode 6150232 attribute.

The InvoiceTerms 6150238 package includes an InvoiceTerms 6150240 entity.

The InvoiceTerms 6150240 entity has a cardinality of zero or one 6150242 meaning that for each instance of the SalesOrder 615022 entity there may be one InvoiceTerms 6150240 entity. The InvoiceTerms 6150240 entity includes an InvoicingDate 6150244 attribute.

The InvoicingDate 6150244 attribute is a Date 6150248 datatype. The InvoicingDate 6150244 attribute has a cardinality of zero or one 6150246 meaning that for each instance of the InvoiceTerms 6150240 entity there may be one InvoicingDate 6150244 attribute.

The Item 6150250 package includes an Item 6150252 entity. The Item 6150250 package includes various packages, namely ProductInformation 6150280, Party 6150292, SalesTerms 6150384, DeliveryTerms 6150402, InvoiceTerms 6150420, TotalValues 6150432 and ScheduleLine 6150480.

The Item 6150252 entity has a cardinality of zero to n 6150254 meaning that for each instance of the SalesOrder 615022 entity there may be zero to n Item 6150252 entities. The Item 6150252 entity includes various attributes, namely ID 6150256, Description 6150262, CancellationReasonCode 6150268 and InvoicingBlockingReasonCode 6150274.

The ID 6150256 attribute is a SalesOrderItemID 6150260 datatype. The ID 6150256 attribute has a cardinality of one 6150258 meaning that for each instance of the Item 6150252 entity there is one ID 6150256 attribute.

The Description 6150262 attribute is a SHORT_Description 6150266 datatype. The Description 6150262 attribute has a cardinality of zero or one 6150264 meaning that for each instance of the Item 6150252 entity there may be one Description 6150262 attribute.

The CancellationReasonCode 6150268 attribute is a CancellationReasonCode 6150272 datatype. The CancellationReasonCode 6150268 attribute has a cardinality of zero or one 6150270 meaning that for each instance of the Item 6150252 entity there may be one CancellationReasonCode 6150268 attribute.

The InvoicingBlockingReasonCode 6150274 attribute is a BlockingReasonCode 6150278 datatype. The InvoicingBlockingReasonCode 6150274 attribute has a cardinality of zero or one 6150276 meaning that for each instance of the Item 6150252 entity there may be one InvoicingBlockingReasonCode 6150274 attribute.

The ProductInformation 6150280 package includes a Product 6150282 entity.

The Product 6150282 entity has a cardinality of zero or one 6150284 meaning that for each instance of the Item 6150252 entity there may be one Product 6150282 entity. The Product 6150282 entity includes a SellerID 6150286 attribute.

The SellerID 6150286 attribute is a ProductPartyID 6150290 datatype. The SellerID 6150286 attribute has a cardinality of one 6150288 meaning that for each instance of the Product 6150282 entity there is one SellerID 6150286 attribute.

The Party 6150292 package includes various entities, namely BuyerParty 6150294, GoodsRecipientParty 6150310, BillToParty 6150326, PayerParty 6150342, ResponsibleEmployeeParty 6150358 and SalesOrganisationParty 6150374.

The BuyerParty 6150294 entity has a cardinality of zero or one 6150296 meaning that for each instance of the Item 6150252 entity there may be one BuyerParty 6150294 entity. The BuyerParty 6150294 entity includes various attributes, namely InternalID 6150298 and FormattedName 6150304.

The InternalID 6150298 attribute is a PartyInternalID 6150302 datatype. The InternalID 6150298 attribute has a cardinality of one 6150300 meaning that for each instance of the BuyerParty 6150294 entity there is one InternalID 6150298 attribute.

The FormattedName 6150304 attribute is a LONG_Name, Qualifier:PartyFormatted 6150308 datatype. The FormattedName 6150304 attribute has a cardinality of zero or one 6150306 meaning that for each instance of the BuyerParty 6150294 entity there may be one FormattedName 6150304 attribute.

The GoodsRecipientParty 6150310 entity has a cardinality of zero or one 6150312 meaning that for each instance of the Item 6150252 entity there may be one GoodsRecipientParty 6150310 entity. The GoodsRecipientParty 6150310 entity includes various attributes, namely InternalID 6150314 and FormattedName 6150320.

The InternalID 6150314 attribute is a PartyInternalID 6150318 datatype. The InternalID 6150314 attribute has a cardinality of one 6150316 meaning that for each instance of the GoodsRecipientParty 6150310 entity there is one InternalID 6150314 attribute.

The FormattedName 6150320 attribute is a LONG_Name, Qualifier:PartyFormatted 6150324 datatype. The FormattedName 6150320 attribute has a cardinality of zero or one 6150322 meaning that for each instance of the GoodsRecipientParty 6150310 entity there may be one FormattedName 6150320 attribute.

The BillToParty 6150326 entity has a cardinality of zero or one 6150328 meaning that for each instance of the Item 6150252 entity there may be one BillToParty 6150326 entity. The BillToParty 6150326 entity includes various attributes, namely InternalID 6150330 and FormattedName 6150336.

The InternalID 6150330 attribute is a PartyInternalID 6150334 datatype. The InternalID 6150330 attribute has a cardinality of one 6150332 meaning that for each instance of the BillToParty 6150326 entity there is one InternalID 6150330 attribute.

The FormattedName 6150336 attribute is a LONG_Name, Qualifier:PartyFormatted 6150340 datatype. The FormattedName 6150336 attribute has a cardinality of zero or one 6150338 meaning that for each instance of the BillToParty 6150326 entity there may be one FormattedName 6150336 attribute.

The PayerParty 6150342 entity has a cardinality of zero or one 6150344 meaning that for each instance of the Item 6150252 entity there may be one PayerParty 6150342 entity. The PayerParty 6150342 entity includes various attributes, namely InternalID 6150346 and FormattedName 6150352.

The InternalID 6150346 attribute is a PartyInternalID 6150350 datatype. The InternalID 6150346 attribute has a cardinality of one 6150348 meaning that for each instance of the PayerParty 6150342 entity there is one InternalID 6150346 attribute.

The FormattedName 6150352 attribute is a LONG_Name, Qualifier:PartyFormatted 6150356 datatype. The FormattedName 6150352 attribute has a cardinality of zero or one 6150354 meaning that for each instance of the PayerParty 6150342 entity there may be one FormattedName 6150352 attribute.

The ResponsibleEmployeeParty 6150358 entity has a cardinality of zero or one 6150360 meaning that for each instance of the Item 6150252 entity there may be one ResponsibleEmployeeParty 6150358 entity. The ResponsibleEmployeeParty 6150358 entity includes various attributes, namely InternalID 6150362 and FormattedName 6150368.

The InternalID 6150362 attribute is a PartyInternalID 6150366 datatype. The InternalID 6150362 attribute has a cardinality of one 6150364 meaning that for each instance of the ResponsibleEmployeeParty 6150358 entity there is one InternalID 6150362 attribute.

The FormattedName 6150368 attribute is a LANGUAGE-INDEPENDENT_LONG_Name,Qualifier:PersonFormatted 6150372 datatype. The FormattedName 6150368 attribute has a cardinality of zero or one 6150370 meaning that for each instance of the ResponsibleEmployeeParty 6150358 entity there may be one FormattedName 6150368 attribute.

The SalesOrganisationParty 6150374 entity has a cardinality of zero or one 6150376 meaning that for each instance of the Item 6150252 entity there may be one SalesOrganisationParty 6150374 entity. The SalesOrganisationParty 6150374 entity includes an InternalID 6150378 attribute.

The InternalID 6150378 attribute is a PartyPartyID 6150382 datatype. The InternalID 6150378 attribute has a cardinality of one 6150380 meaning that for each instance of the SalesOrganisationParty 6150374 entity there is one InternalID 6150378 attribute.

The SalesTerms 6150384 package includes a SalesTerms 6150386 entity.

The SalesTerms 6150386 entity has a cardinality of zero or one 6150388 meaning that for each instance of the Item 6150252 entity there may be one SalesTerms 6150386 entity. The SalesTerms 6150386 entity includes various attributes, namely DistributionChannelCode 6150390 and DivisionCode 6150396.

The DistributionChannelCode 6150390 attribute is a DistributionChannelCode 6150394 datatype. The DistributionChannelCode 6150390 attribute has a cardinality of zero or one 6150392 meaning that for each instance of the SalesTerms 6150386 entity there may be one DistributionChannelCode 6150390 attribute.

The DivisionCode 6150396 attribute is a DivisionCode 6150400 datatype. The DivisionCode 6150396 attribute has a cardinality of zero or one 6150398 meaning that for each instance of the SalesTerms 6150386 entity there may be one DivisionCode 6150396 attribute.

The DeliveryTerms 6150402 package includes a DeliveryTerms 6150404 entity.

The DeliveryTerms 6150404 entity has a cardinality of zero or one 6150406 meaning that for each instance of the Item 6150252 entity there may be one DeliveryTerms 6150404 entity. The DeliveryTerms 6150404 entity includes various attributes, namely PriorityValue 6150408 and Incoterms 6150414.

The PriorityValue 6150408 attribute is a PriorityValue 6150412 datatype. The PriorityValue 6150408 attribute has a cardinality of zero or one 6150410 meaning that for each instance of the DeliveryTerms 6150404 entity there may be one PriorityValue 6150408 attribute.

The Incoterms 6150414 attribute is an Incoterms 6150418 datatype. The Incoterms 6150414 attribute has a cardinality of zero or one 6150416 meaning that for each instance of the DeliveryTerms 6150404 entity there may be one Incoterms 6150414 attribute.

The InvoiceTerms 6150420 package includes an InvoiceTerms 6150422 entity.

The InvoiceTerms 6150422 entity has a cardinality of zero or one 6150424 meaning that for each instance of the Item 6150252 entity there may be one InvoiceTerms 6150422 entity. The InvoiceTerms 6150422 entity includes an InvoiceDate 6150426 attribute.

The InvoiceDate 6150426 attribute is a Date 6150430 datatype. The InvoiceDate 6150426 attribute has a cardinality of zero or one 6150428 meaning that for each instance of the InvoiceTerms 6150422 entity there may be one InvoiceDate 6150426 attribute.

The TotalValues 6150432 package includes a TotalValues 6150434 entity.

The TotalValues 6150434 entity has a cardinality of zero or one 6150436 meaning that for each instance of the Item 6150252 entity there may be one TotalValues 6150434 entity. The TotalValues 6150434 entity includes various attributes, namely RequestedQuantity 6150438, ConfirmedQuantity 6150444, GrossWeightMeasure 6150450, NetWeightMeasure 6150456, VolumeMeasure 6150462, NetAmount 6150468 and NetPrice 6150474.

The RequestedQuantity 6150438 attribute is a Quantity 6150442 datatype. The RequestedQuantity 6150438 attribute has a cardinality of zero or one 6150440 meaning that for each instance of the TotalValues 6150434 entity there may be one RequestedQuantity 6150438 attribute.

The ConfirmedQuantity 6150444 attribute is a Quantity 6150448 datatype. The ConfirmedQuantity 6150444 attribute has a cardinality of zero or one 6150446 meaning that for each instance of the TotalValues 6150434 entity there may be one ConfirmedQuantity 6150444 attribute.

The GrossWeightMeasure 6150450 attribute is a Measure 6150454 datatype. The GrossWeightMeasure 6150450 attribute has a cardinality of zero or one 6150452 meaning that for each instance of the TotalValues 6150434 entity there may be one GrossWeightMeasure 6150450 attribute.

The NetWeightMeasure 6150456 attribute is a Measure 6150460 datatype. The NetWeightMeasure 6150456 attribute has a cardinality of zero or one 6150458 meaning that for each instance of the TotalValues 6150434 entity there may be one NetWeightMeasure 6150456 attribute.

The VolumeMeasure 6150462 attribute is a Measure 6150466 datatype. The VolumeMeasure 6150462 attribute has a cardinality of zero or one 6150464 meaning that for each instance of the TotalValues 6150434 entity there may be one VolumeMeasure 6150462 attribute.

The NetAmount 6150468 attribute is an Amount 6150472 datatype. The NetAmount 6150468 attribute has a cardinality of zero or one 6150470 meaning that for each instance of the TotalValues 6150434 entity there may be one NetAmount 6150468 attribute.

The NetPrice 6150474 attribute is a Price 6150478 datatype. The NetPrice 6150474 attribute has a cardinality of zero or one 6150476 meaning that for each instance of the TotalValues 6150434 entity there may be one NetPrice 6150474 attribute.

The ScheduleLine 6150480 package includes a ScheduleLine 6150482 entity.

The ScheduleLine 6150482 entity has a cardinality of zero to n 6150484 meaning that for each instance of the Item 6150252 entity there may be zero to n ScheduleLine 6150482 entities. The ScheduleLine 6150482 entity includes various attributes, namely ID 6150486, Date 6150492, RequestedQuantity 6150498, ConfirmedQuantity 6150504, DeliveryBlockingReasonCode 6150510 and ReceiptTime 6150516.

The ID 6150486 attribute is a BusinessTransactionDocumentItemScheduleLineID 6150490 datatype. The ID 6150486 attribute has a cardinality of one 6150488 meaning that for each instance of the ScheduleLine 6150482 entity there is one ID 6150486 attribute.

The Date 6150492 attribute is a Date 6150496 datatype. The Date 6150492 attribute has a cardinality of zero or one 6150494 meaning that for each instance of the ScheduleLine 6150482 entity there may be one Date 6150492 attribute.

The RequestedQuantity 6150498 attribute is a Quantity 6150502 datatype. The RequestedQuantity 6150498 attribute has a cardinality of zero or one 6150500 meaning that for each instance of the ScheduleLine 6150482 entity there may be one RequestedQuantity 6150498 attribute.

The ConfirmedQuantity 6150504 attribute is a Quantity 6150508 datatype. The ConfirmedQuantity 6150504 attribute has a cardinality of zero or one 6150506 meaning that for each instance of the ScheduleLine 6150482 entity there may be one ConfirmedQuantity 6150504 attribute.

The DeliveryBlockingReasonCode 6150510 attribute is a BlockingReasonCode 6150514 datatype. The DeliveryBlockingReasonCode 6150510 attribute has a cardinality of zero or one 6150512 meaning that for each instance of the ScheduleLine 6150482 entity there may be one DeliveryBlockingReasonCode 6150510 attribute.

The ReceiptTime 6150516 attribute is a Time 6150520 datatype. The ReceiptTime 6150516 attribute has a cardinality of zero or one 6150518 meaning that for each instance of the ScheduleLine 6150482 entity there may be one ReceiptTime 6150516 attribute.

The Log 6150522 package is a Log 6150528 datatype. The Log 6150522 package includes a Log 6150524 entity.

The Log 6150524 entity has a cardinality of one 6150526 meaning that for each instance of the SalesOrderByIDResponseMessage_sync 615002 entity there is one Log 6150524 entity.

Message Data Type

FIGS. 605-1 through 605-5 show a SalesOrderBasicDataByBuyerAndBasicDataResponseMessage_sync 605000 package. The SalesOrderBasicDataByBuyerAndBasicDataResponseMessage_sync 605000 package is a SalesOrderBasicDataByBuyerAndBasicDataResponseMessage_sync 605004 datatype. The SalesOrderBasicDataByBuyerAndBasicDataResponseMessage_sync 605000 package includes a SalesOrderBasicDataByBuyerAndBasicDataResponseMessage_sync 605002 entity. The SalesOrderBasicDataByBuyerAndBasicDataResponseMessage_sync 605000 package includes various packages, namely SalesOrder 605020 and Log 6050170.

The SalesOrder 605020 package includes a SalesOrder 605022 entity. The SalesOrder 605020 package includes various packages, namely Party 605050, SalesTerms 6050116, DateTerms 6050146 and TotalValues 6050158.

The SalesOrder 605022 entity has a cardinality of zero to n 605024 meaning that for each instance of the SalesOrderBasicDataByBuyerAndBasicDataResponseMessage_sync 605002 entity there may be zero to n SalesOrder 605022 entities. The SalesOrder 605022 entity includes various attributes, namely ID 605026, ProcessingTypeCode 605032, ProcessingTypeName 605038 and BuyerID 605044.

The ID 605026 attribute is a SalesOrderID 605030 datatype. The ID 605026 attribute has a cardinality of one 605028 meaning that for each instance of the SalesOrder 605022 entity there is one ID 605026 attribute.

The ProcessingTypeCode 605032 attribute is a BusinessTransactionDocumentProcessingTypeCode 605036 datatype. The ProcessingTypeCode 605032 attribute has a cardinality of zero or one 605034 meaning that for each instance of the SalesOrder 605022 entity there may be one ProcessingTypeCode 605032 attribute.

The ProcessingTypeName 605038 attribute is a LEN20_Name,Qualifier:ProcessingType 605042 datatype. The ProcessingTypeName 605038 attribute has a cardinality of zero or one 605040 meaning that for each instance of the SalesOrder 605022 entity there may be one ProcessingTypeName 605038 attribute.

The BuyerID 605044 attribute is a BusinessTransactionDocumentID 605048 datatype. The BuyerID 605044 attribute has a cardinality of zero or one 605046 meaning that for each instance of the SalesOrder 605022 entity there may be one BuyerID 605044 attribute.

The Party 605050 package includes various entities, namely BuyerParty 605052, SalesOrganisationParty 605068, SalesOfficeParty 605084 and SalesGroupParty 6050100.

The BuyerParty 605052 entity has a cardinality of one 605054 meaning that for each instance of the SalesOrder 605022 entity there is one BuyerParty 605052 entity. The BuyerParty 605052 entity includes various attributes, namely InternalID 605056 and FormattedName 605062.

The InternalID 605056 attribute is a PartyInternalID 605060 datatype. The InternalID 605056 attribute has a cardinality of one 605058 meaning that for each instance of the BuyerParty 605052 entity there is one InternalID 605056 attribute.

The FormattedName 605062 attribute is a LONG_Name, Qualifier:PartyFormatted 605066 datatype. The FormattedName 605062 attribute has a cardinality of zero or one 605064 meaning that for each instance of the BuyerParty 605052 entity there may be one FormattedName 605062 attribute.

The SalesOrganisationParty 605068 entity has a cardinality of one 605070 meaning that for each instance of the SalesOrder 605022 entity there is one SalesOrganisationParty 605068 entity. The SalesOrganisationParty 605068 entity includes various attributes, namely InternalID 605072 and FormattedName 605078.

The InternalID 605072 attribute is a PartyInternalID 605076 datatype. The InternalID 605072 attribute has a cardinality of one 605074 meaning that for each instance of the SalesOrganisationParty 605068 entity there is one InternalID 605072 attribute.

The FormattedName 605078 attribute is a LONG_Name, Qualifier:PartyFormatted 605082 datatype. The FormattedName 605078 attribute has a cardinality of zero or one 605080 meaning that for each instance of the SalesOrganisationParty 605068 entity there may be one FormattedName 605078 attribute.

The SalesOfficeParty 605084 entity has a cardinality of zero or one 605086 meaning that for each instance of the SalesOrder 605022 entity there may be one SalesOfficeParty 605084 entity. The SalesOfficeParty 605084 entity includes various attributes, namely InternalID 605088 and FormattedName 605094.

The InternalID 605088 attribute is a PartyInternalID 605092 datatype. The InternalID 605088 attribute has a cardinality of one 605090 meaning that for each instance of the SalesOfficeParty 605084 entity there is one InternalID 605088 attribute.

The FormattedName 605094 attribute is a LONG_Name, Qualifier:PartyFormatted 605098 datatype. The FormattedName 605094 attribute has a cardinality of zero or one 605096 meaning that for each instance of the SalesOfficeParty 605084 entity there may be one FormattedName 605094 attribute.

The SalesGroupParty 6050100 entity has a cardinality of zero or one 6050102 meaning that for each instance of the SalesOrder 605022 entity there may be one SalesGroupParty 6050100 entity. The SalesGroupParty 6050100 entity includes various attributes, namely InternalID 6050104 and FormattedName 6050110.

The InternalID 6050104 attribute is a PartyInternalID 6050108 datatype. The InternalID 6050104 attribute has a cardinality of one 6050106 meaning that for each instance of the SalesGroupParty 6050100 entity there is one InternalID 6050104 attribute.

The FormattedName 6050110 attribute is a LONG_Name, Qualifier:PartyFormatted 6050114 datatype. The FormattedName 6050110 attribute has a cardinality of zero or one 6050112 meaning that for each instance of the SalesGroupParty 6050100 entity there may be one FormattedName 6050110 attribute.

The SalesTerms 6050116 package includes a SalesTerms 6050118 entity.

The SalesTerms 6050118 entity has a cardinality of zero or one 6050120 meaning that for each instance of the SalesOrder 605022 entity there may be one SalesTerms 6050118 entity. The SalesTerms 6050118 entity includes various attributes, namely DistributionChannelCode 6050122, DistributionChannelName 6050128, DivisionCode 6050134 and DivisionName 6050140.

The DistributionChannelCode 6050122 attribute is a DistributionChannelCode 6050126 datatype. The DistributionChannelCode 6050122 attribute has a cardinality of zero or one 6050124 meaning that for each instance of the SalesTerms 6050118 entity there may be one DistributionChannelCode 6050122 attribute.

The DistributionChannelName 6050128 attribute is a LEN20_Name,Qualifier:DistributionChannel 6050132 datatype. The DistributionChannelName 6050128 attribute has a cardinality of zero or one 6050130 meaning that for each instance of the SalesTerms 6050118 entity there may be one DistributionChannelName 6050128 attribute.

The DivisionCode 6050134 attribute is a DivisionCode 6050138 datatype. The DivisionCode 6050134 attribute has a cardinality of zero or one 6050136 meaning that for each instance of the SalesTerms 6050118 entity there may be one DivisionCode 6050134 attribute.

The DivisionName 6050140 attribute is a LEN20_Name, Qualifier:Division 6050144 datatype. The DivisionName 6050140 attribute has a cardinality of zero or one 6050142 meaning that for each instance of the SalesTerms 6050118 entity there may be one DivisionName 6050140 attribute.

The DateTerms 6050146 package includes a DateTerms 6050148 entity.

The DateTerms 6050148 entity has a cardinality of zero or one 6050150 meaning that for each instance of the SalesOrder 605022 entity there may be one DateTerms 6050148 entity. The DateTerms 6050148 entity includes a RequestDate 6050152 attribute.

The RequestDate 6050152 attribute is a Date 6050156 datatype. The RequestDate 6050152 attribute has a cardinality of zero or one 6050154 meaning that for each instance of the DateTerms 6050148 entity there may be one RequestDate 6050152 attribute.

The TotalValues 6050158 package includes a TotalValues 6050160 entity.

The TotalValues 6050160 entity has a cardinality of zero or one 6050162 meaning that for each instance of the SalesOrder 605022 entity there may be one TotalValues 6050160 entity. The TotalValues 6050160 entity includes a NetAmount 6050164 attribute.

The NetAmount 6050164 attribute is an Amount 6050168 datatype. The NetAmount 6050164 attribute has a cardinality of zero or one 6050166 meaning that for each instance of the TotalValues 6050160 entity there may be one NetAmount 6050164 attribute.

The Log 6050170 package is a Log 6050176 datatype. The Log 6050170 package includes a Log 6050172 entity.

The Log 6050172 entity has a cardinality of one 6050174 meaning that for each instance of the SalesOrderBasicDataByBuyerAndBasicDataResponseMessage_sync 605002 entity there is one Log 6050172 entity.

Message Data Type

FIGS. 607-1 through 607-4 show a SalesOrderBasicDataByBuyerAndCreditBlockedResponseMessage_sync 607000 package. The SalesOrderBasicDataByBuyerAndCreditBlockedResponseMessage_sync 607000 package is a SalesOrderBasicDataByBuyerAndCreditBlockedResponseMessage_sync 607004 datatype. The SalesOrderBasicDataByBuyerAndCreditBlockedResponseMessage_sync 607000 package includes a SalesOrderBasicDataByBuyerAndCreditBlockedResponseMessage_sync 607002 entity. The SalesOrderBasicDataByBuyerAndCreditBlockedResponseMessage_sync 607000 package includes various packages, namely SalesOrder 607020 and Log 6070170.

The SalesOrder 607020 package includes a SalesOrder 607022 entity. The SalesOrder 607020 package includes various packages, namely Party 607050, SalesTerms 6070116, DateTerms 6070146 and TotalValues 6070158.

The SalesOrder 607022 entity has a cardinality of zero to n 607024 meaning that for each instance of the SalesOrderBasicDataByBuyerAndCreditBlockedResponseMessage_sync 607002 entity there may be zero to n SalesOrder 607022 entities. The SalesOrder 607022 entity includes various attributes, namely ID 607026, ProcessingTypeCode 607032, ProcessingTypeName 607038 and BuyerID 607044.

The ID 607026 attribute is a SalesOrderID 607030 datatype. The ID 607026 attribute has a cardinality of one 607028 meaning that for each instance of the SalesOrder 607022 entity there is one ID 607026 attribute.

The ProcessingTypeCode 607032 attribute is a BusinessTransactionDocumentProcessingTypeCode 607036 datatype. The ProcessingTypeCode 607032 attribute has a cardinality of zero or one 607034 meaning that for each instance of the SalesOrder 607022 entity there may be one ProcessingTypeCode 607032 attribute.

The ProcessingTypeName 607038 attribute is a LEN20_Name,Qualifier:ProcessingType 607042 datatype. The ProcessingTypeName 607038 attribute has a cardinality of zero or one 607040 meaning that for each instance of the SalesOrder 607022 entity there may be one ProcessingTypeName 607038 attribute.

The BuyerID 607044 attribute is a BusinessTransactionDocumentID 607048 datatype. The BuyerID 607044 attribute has a cardinality of zero or one 607046 meaning that for each instance of the SalesOrder 607022 entity there may be one BuyerID 607044 attribute.

The Party 607050 package includes various entities, namely BuyerParty 607052, SalesOrganisationParty 607068, SalesOfficeParty 607084 and SalesGroupParty 6070100.

The BuyerParty 607052 entity has a cardinality of one 607054 meaning that for each instance of the SalesOrder 607022 entity there is one BuyerParty 607052 entity. The BuyerParty 607052 entity includes various attributes, namely InternalID 607056 and FormattedName 607062.

The InternalID 607056 attribute is a PartyInternalID 607060 datatype. The InternalID 607056 attribute has a cardinality of one 607058 meaning that for each instance of the BuyerParty 607052 entity there is one InternalID 607056 attribute.

The FormattedName 607062 attribute is a LONG_Name, Qualifier:PartyFormatted 607066 datatype. The FormattedName 607062 attribute has a cardinality of zero or one 607064 meaning that for each instance of the BuyerParty 607052 entity there may be one FormattedName 607062 attribute.

The SalesOrganisationParty 607068 entity has a cardinality of one 607070 meaning that for each instance of the SalesOrder 607022 entity there is one SalesOrganisationParty 607068 entity. The SalesOrganisationParty 607068 entity includes various attributes, namely InternalID 607072 and FormattedName 607078.

The InternalID 607072 attribute is a PartyInternalID 607076 datatype. The InternalID 607072 attribute has a cardinality of one 607074 meaning that for each instance of the SalesOrganisationParty 607068 entity there is one InternalID 607072 attribute.

The FormattedName 607078 attribute is a LONG_Name, Qualifier:PartyFormatted 607082 datatype. The FormattedName 607078 attribute has a cardinality of zero or one 607080 meaning that for each instance of the SalesOrganisationParty 607068 entity there may be one FormattedName 607078 attribute.

The SalesOfficeParty 607084 entity has a cardinality of zero or one 607086 meaning that for each instance of the SalesOrder 607022 entity there may be one SalesOfficeParty 607084 entity. The SalesOfficeParty 607084 entity includes various attributes, namely InternalID 607088 and FormattedName 607094.

The InternalID 607088 attribute is a PartyInternalID 607092 datatype. The InternalID 607088 attribute has a cardinality of one 607090 meaning that for each instance of the SalesOfficeParty 607084 entity there is one InternalID 607088 attribute.

The FormattedName 607094 attribute is a LONG_Name, Qualifier:PartyFormatted 607098 datatype. The FormattedName 607094 attribute has a cardinality of zero or one 607096 meaning that for each instance of the SalesOfficeParty 607084 entity there may be one FormattedName 607094 attribute.

The SalesGroupParty 6070100 entity has a cardinality of zero or one 6070102 meaning that for each instance of the SalesOrder 607022 entity there may be one SalesGroupParty 6070100 entity. The SalesGroupParty 6070100 entity includes various attributes, namely InternalID 6070104 and FormattedName 6070110.

The InternalID 6070104 attribute is a PartyInternalID 6070108 datatype. The InternalID 6070104 attribute has a cardinality of one 6070106 meaning that for each instance of the SalesGroupParty 6070100 entity there is one InternalID 6070104 attribute.

The FormattedName 6070110 attribute is a LONG_Name, Qualifier:PartyFormatted 6070114 datatype. The FormattedName 6070110 attribute has a cardinality of zero or one 6070112 meaning that for each instance of the SalesGroupParty 6070100 entity there may be one FormattedName 6070110 attribute.

The SalesTerms 6070116 package includes a SalesTerms 6070118 entity.

The SalesTerms 6070118 entity has a cardinality of zero or one 6070120 meaning that for each instance of the SalesOrder 607022 entity there may be one SalesTerms 6070118 entity. The SalesTerms 6070118 entity includes various attributes, namely DistributionChannelCode 6070122, DistributionChannelName 6070128, DivisionCode 6070134 and DivisionName 6070140.

The DistributionChannelCode 6070122 attribute is a DistributionChannelCode 6070126 datatype. The DistributionChannelCode 6070122 attribute has a cardinality of zero or one 6070124 meaning that for each instance of the SalesTerms 6070118 entity there may be one DistributionChannelCode 6070122 attribute.

The DistributionChannelName 6070128 attribute is a LEN20_Name,Qualifier:DistributionChannel 6070132 datatype. The DistributionChannelName 6070128 attribute has a cardinality of zero or one 6070130 meaning that for each instance of the SalesTerms 6070118 entity there may be one DistributionChannelName 6070128 attribute.

The DivisionCode 6070134 attribute is a DivisionCode 6070138 datatype. The DivisionCode 6070134 attribute has a cardinality of zero or one 6070136 meaning that for each instance of the SalesTerms 6070118 entity there may be one DivisionCode 6070134 attribute.

The DivisionName 6070140 attribute is a LEN20_Name, Qualifier:Division 6070144 datatype. The DivisionName 6070140 attribute has a cardinality of zero or one 6070142 meaning that for each instance of the SalesTerms 6070118 entity there may be one DivisionName 6070140 attribute.

The DateTerms 6070146 package includes a DateTerms 6070148 entity.

The DateTerms 6070148 entity has a cardinality of zero or one 6070150 meaning that for each instance of the SalesOrder 607022 entity there may be one DateTerms 6070148 entity. The DateTerms 6070148 entity includes a RequestDate 6070152 attribute.

The RequestDate 6070152 attribute is a Date 6070156 datatype. The RequestDate 6070152 attribute has a cardinality of zero or one 6070154 meaning that for each instance of the DateTerms 6070148 entity there may be one RequestDate 6070152 attribute.

The TotalValues 6070158 package includes a TotalValues 6070160 entity.

The TotalValues 6070160 entity has a cardinality of zero or one 6070162 meaning that for each instance of the SalesOrder 607022 entity there may be one TotalValues 6070160 entity. The TotalValues 6070160 entity includes a NetAmount 6070164 attribute.

The NetAmount 6070164 attribute is an Amount 6070168 datatype. The NetAmount 6070164 attribute has a cardinality of zero or one 6070166 meaning that for each instance of the TotalValues 6070160 entity there may be one NetAmount 6070164 attribute.

The Log 6070170 package is a Log 6070176 datatype. The Log 6070170 package includes a Log 6070172 entity.

The Log 6070172 entity has a cardinality of one 6070174 meaning that for each instance of the SalesOrderBasicDataByBuyerAndCreditBlockedResponseMessage_sync 607002 entity there is one Log 6070172 entity.

Message Data Type

FIGS. 609-1 through 609-3 show a SalesOrderBasicDataByBuyerAndDeliveryBlockedResponseMessage_sync 609000 package. The SalesOrderBasicDataByBuyerAndDeliveryBlockedResponseMessage_sync 609000 package is a SalesOrderBasicDataByBuyerAndDeliveryBlockedResponseMessage_sync 609004 datatype. The SalesOrderBasicDataByBuyerAndDeliveryBlockedResponseMessage_sync 609000 package includes a SalesOrderBasicDataByBuyerAndDeliveryBlockedResponseMessage_sync 609002 entity. The SalesOrderBasicDataByBuyerAndDeliveryBlockedResponseMessage_sync 609000 package includes various packages, namely SalesOrder 609020 and Log 6090120.

The SalesOrder 609020 package includes a SalesOrder 609022 entity. The SalesOrder 609020 package includes various packages, namely Party 609050, SalesTerms 609078, PricingTerms 609096 and TotalValues 6090108.

The SalesOrder 609022 entity has a cardinality of zero to n 609024 meaning that for each instance of the SalesOrderBasicDataByBuyerAndDeliveryBlockedResponseMessage_sync 609002 entity there may be zero to n SalesOrder 609022 entities. The SalesOrder 609022 entity includes various attributes, namely ID 609026, Date 609032, ProcessingTypeCode 609038 and BuyerID 609044.

The ID 609026 attribute is a SalesOrderID 609030 datatype. The ID 609026 attribute has a cardinality of one 609028 meaning that for each instance of the SalesOrder 609022 entity there is one ID 609026 attribute.

The Date 609032 attribute is a Date 609036 datatype. The Date 609032 attribute has a cardinality of zero or one 609034 meaning that for each instance of the SalesOrder 609022 entity there may be one Date 609032 attribute.

The ProcessingTypeCode 609038 attribute is a BusinessTransactionDocumentProcessingTypeCode 609042 datatype. The ProcessingTypeCode 609038 attribute has a cardinality of zero or one 609040 meaning that for each instance of the SalesOrder 609022 entity there may be one ProcessingTypeCode 609038 attribute.

The BuyerID 609044 attribute is a BusinessTransactionDocumentID 609048 datatype. The BuyerID 609044 attribute has a cardinality of zero or one 609046 meaning that for each instance of the SalesOrder 609022 entity there may be one BuyerID 609044 attribute.

The Party 609050 package includes various entities, namely BuyerParty 609052 and SalesOrganisationParty 609068.

The BuyerParty 609052 entity has a cardinality of one 609054 meaning that for each instance of the SalesOrder 609022 entity there is one BuyerParty 609052 entity. The BuyerParty 609052 entity includes various attributes, namely InternalID 609056 and FormattedName 609062.

The InternalID 609056 attribute is a PartyInternalID 609060 datatype. The InternalID 609056 attribute has a cardinality of one 609058 meaning that for each instance of the BuyerParty 609052 entity there is one InternalID 609056 attribute.

The FormattedName 609062 attribute is a LONG_Name, Qualifier:PartyFormatted 609066 datatype. The FormattedName 609062 attribute has a cardinality of zero or one 609064 meaning that for each instance of the BuyerParty 609052 entity there may be one FormattedName 609062 attribute.

The SalesOrganisationParty 609068 entity has a cardinality of one 609070 meaning that for each instance of the SalesOrder 609022 entity there is one SalesOrganisationParty 609068 entity. The SalesOrganisationParty 609068 entity includes an InternalID 609072 attribute.

The InternalID 609072 attribute is a PartyInternalID 609076 datatype. The InternalID 609072 attribute has a cardinality of one 609074 meaning that for each instance of the SalesOrganisationParty 609068 entity there is one InternalID 609072 attribute.

The SalesTerms 609078 package includes a SalesTerms 609080 entity.

The SalesTerms 609080 entity has a cardinality of zero or one 609082 meaning that for each instance of the SalesOrder 609022 entity there may be one SalesTerms 609080 entity. The SalesTerms 609080 entity includes various attributes, namely DistributionChannelCode 609084 and DivisionCode 609090.

The DistributionChannelCode 609084 attribute is a DistributionChannelCode 609088 datatype. The DistributionChannelCode 609084 attribute has a cardinality of zero or one 609086 meaning that for each instance of the SalesTerms 609080 entity there may be one DistributionChannelCode 609084 attribute.

The DivisionCode 609090 attribute is a DivisionCode 609094 datatype. The DivisionCode 609090 attribute has a cardinality of zero or one 609092 meaning that for each instance of the SalesTerms 609080 entity there may be one DivisionCode 609090 attribute.

The PricingTerms 609096 package includes a PricingTerms 609098 entity.

The PricingTerms 609098 entity has a cardinality of zero or one 6090100 meaning that for each instance of the SalesOrder 609022 entity there may be one PricingTerms 609098 entity. The PricingTerms 609098 entity includes a CurrencyCode 6090102 attribute.

The CurrencyCode 6090102 attribute is a CurrencyCode 6090106 datatype. The CurrencyCode 6090102 attribute has a cardinality of zero or one 6090104 meaning that for each instance of the PricingTerms 609098 entity there may be one CurrencyCode 6090102 attribute.

The TotalValues 6090108 package includes a TotalValues 6090110 entity.

The TotalValues 6090110 entity has a cardinality of zero or one 6090112 meaning that for each instance of the SalesOrder 609022 entity there may be one TotalValues 6090110 entity. The TotalValues 6090110 entity includes a NetAmount 6090114 attribute.

The NetAmount 6090114 attribute is an Amount 6090118 datatype. The NetAmount 6090114 attribute has a cardinality of zero or one 6090116 meaning that for each instance of the TotalValues 6090110 entity there may be one NetAmount 6090114 attribute.

The Log 6090120 package is a Log 6090126 datatype. The Log 6090120 package includes a Log 6090122 entity.

The Log 6090122 entity has a cardinality of one 6090124 meaning that for each instance of the SalesOrderBasicDataByBuyerAndDeliveryBlockedResponseMessage_sync 609002 entity there is one Log 6090122 entity.

Message Data Type

FIGS. 611-1 through 611-5 show a SalesOrderBasicDataByBuyerAndIncompletenessResponseMessage_sync 611000 package. The SalesOrderBasicDataByBuyerAndIncompletenessResponseMessage__sync 611000 package is a SalesOrderBasicDataByBuyerAndIncompletenessResponseMessage_sync 611004 datatype. The SalesOrderBasicDataByBuyerAndIncompletenessResponseMessage_sync 611000 package includes a SalesOrderBasicDataByBuyerAndIncompletenessResponseMessage_sync 611002 entity. The SalesOrderBasicDataByBuyerAndIncompletenessResponseMessage_sync 611000 package includes various packages, namely SalesOrder 611020 and Log 6110170.

The SalesOrder 611020 package includes a SalesOrder 611022 entity. The SalesOrder 611020 package includes various packages, namely Party 611050, SalesTerms 6110116, DateTerms 6110146 and TotalValues 6110158.

The SalesOrder 611022 entity has a cardinality of zero to n 611024 meaning that for each instance of the SalesOrderBasicDataByBuyerAndIncompletenessResponseMessage_sync 611002 entity there may be zero to n SalesOrder 611022 entities. The SalesOrder 611022 entity includes various attributes, namely ID 611026, ProcessingTypeCode 611032, ProcessingTypeName 611038 and BuyerID 611044.

The ID 611026 attribute is a SalesOrderID 611030 datatype. The ID 611026 attribute has a cardinality of one 611028 meaning that for each instance of the SalesOrder 611022 entity there is one ID 611026 attribute.

The ProcessingTypeCode 611032 attribute is a BusinessTransactionDocumentProcessingTypeCode 611036 datatype. The ProcessingTypeCode 611032 attribute has a cardinality of zero or one 611034 meaning that for each instance of the SalesOrder 611022 entity there may be one ProcessingTypeCode 611032 attribute.

The ProcessingTypeName 611038 attribute is a LEN20_Name,Qualifier:ProcessingType 611042 datatype. The ProcessingTypeName 611038 attribute has a cardinality of zero or one 611040 meaning that for each instance of the SalesOrder 611022 entity there may be one ProcessingTypeName 611038 attribute.

The BuyerID 611044 attribute is a BusinessTransactionDocumentID 611048 datatype. The BuyerID 611044 attribute has a cardinality of zero or one 611046 meaning that for each instance of the SalesOrder 611022 entity there may be one BuyerID 611044 attribute.

The Party 611050 package includes various entities, namely BuyerParty 611052, SalesOrganisationParty 611068, SalesOfficeParty 611084 and SalesGroupParty 6110100.

The BuyerParty 611052 entity has a cardinality of one 611054 meaning that for each instance of the SalesOrder 611022 entity there is one BuyerParty 611052 entity. The BuyerParty 611052 entity includes various attributes, namely InternalID 611056 and FormattedName 611062.

The InternalID 611056 attribute is a PartyInternalID 611060 datatype. The InternalID 611056 attribute has a cardinality of one 611058 meaning that for each instance of the BuyerParty 611052 entity there is one InternalID 611056 attribute.

The FormattedName 611062 attribute is a LONG_Name, Qualifier:PartyFormatted 611066 datatype. The FormattedName 611062 attribute has a cardinality of zero or one 611064 meaning that for each instance of the BuyerParty 611052 entity there may be one FormattedName 611062 attribute.

The SalesOrganisationParty 611068 entity has a cardinality of one 611070 meaning that for each instance of the SalesOrder 611022 entity there is one SalesOrganisationParty 611068 entity. The SalesOrganisationParty 611068 entity includes various attributes, namely InternalID 611072 and FormattedName 611078.

The InternalID 611072 attribute is a PartyInternalID 611076 datatype. The InternalID 611072 attribute has a cardinality of one 611074 meaning that for each instance of the SalesOrganisationParty 611068 entity there is one InternalID 611072 attribute.

The FormattedName 611078 attribute is a LONG_Name, Qualifier:PartyFormatted 611082 datatype. The FormattedName 611078 attribute has a cardinality of zero or one 611080 meaning that for each instance of the SalesOrganisationParty 611068 entity there may be one FormattedName 611078 attribute.

The SalesOfficeParty 611084 entity has a cardinality of zero or one 611086 meaning that for each instance of the SalesOrder 611022 entity there may be one SalesOfficeParty 611084 entity. The SalesOfficeParty 611084 entity includes various attributes, namely InternalID 611088 and FormattedName 611094.

The InternalID 611088 attribute is a PartyInternalID 611092 datatype. The InternalID 611088 attribute has a cardinality of one 611090 meaning that for each instance of the SalesOfficeParty 611084 entity there is one InternalID 611088 attribute.

The FormattedName 611094 attribute is a LONG_Name, Qualifier:PartyFormatted 611098 datatype. The FormattedName 611094 attribute has a cardinality of zero or one 611096 meaning that for each instance of the SalesOfficeParty 611084 entity there may be one FormattedName 611094 attribute.

The SalesGroupParty 6110100 entity has a cardinality of zero or one 6110102 meaning that for each instance of the SalesOrder 611022 entity there may be one SalesGroupParty 6110100 entity. The SalesGroupParty 6110100 entity includes various attributes, namely InternalID 6110104 and FormattedName 6110110.

The InternalID 6110104 attribute is a PartyInternalID 6110108 datatype. The InternalID 6110104 attribute has a cardinality of one 6110106 meaning that for each instance of the SalesGroupParty 6110100 entity there is one InternalID 6110104 attribute.

The FormattedName 6110110 attribute is a LONG_Name, Qualifier:PartyFormatted 6110114 datatype. The FormattedName 6110110 attribute has a cardinality of zero or one 6110112 meaning that for each instance of the SalesGroupParty 6110100 entity there may be one FormattedName 6110110 attribute.

The SalesTerms 6110116 package includes a SalesTerms 6110118 entity.

The SalesTerms 6110118 entity has a cardinality of zero or one 6110120 meaning that for each instance of the SalesOrder 611022 entity there may be one SalesTerms 6110118 entity. The SalesTerms 6110118 entity includes various attributes, namely DistributionChannelCode 6110122, DistributionChannelName 6110128, DivisionCode 6110134 and DivisionName 6110140.

The DistributionChannelCode 6110122 attribute is a DistributionChannelCode 6110126 datatype. The DistributionChannelCode 6110122 attribute has a cardinality of zero or one 6110124 meaning that for each instance of the SalesTerms 6110118 entity there may be one DistributionChannelCode 6110122 attribute.

The DistributionChannelName 6110128 attribute is a LEN20_Name,Qualifier:DistributionChannel 6110132 datatype. The DistributionChannelName 6110128 attribute has a cardinality of zero or one 6110130 meaning that for each instance of the SalesTerms 6110118 entity there may be one DistributionChannelName 6110128 attribute.

The DivisionCode 6110134 attribute is a DivisionCode 6110138 datatype. The DivisionCode 6110134 attribute has a cardinality of zero or one 6110136 meaning that for each instance of the SalesTerms 6110118 entity there may be one DivisionCode 6110134 attribute.

The DivisionName 6110140 attribute is a LEN20_Name, Qualifier:Division 6110144 datatype. The DivisionName 6110140 attribute has a cardinality of zero or one 6110142 meaning that for each instance of the SalesTerms 6110118 entity there may be one DivisionName 6110140 attribute.

The DateTerms 6110146 package includes a DateTerms 6110148 entity.

The DateTerms 6110148 entity has a cardinality of zero or one 6110150 meaning that for each instance of the SalesOrder 611022 entity there may be one DateTerms 6110148 entity. The DateTerms 6110148 entity includes a RequestDate 6110152 attribute.

The RequestDate 6110152 attribute is a Date 6110156 datatype. The RequestDate 6110152 attribute has a cardinality of zero or one 6110154 meaning that for each instance of the DateTerms 6110148 entity there may be one RequestDate 6110152 attribute.

The TotalValues 6110158 package includes a TotalValues 6110160 entity.

The TotalValues 6110160 entity has a cardinality of zero or one 6110162 meaning that for each instance of the SalesOrder 611022 entity there may be one TotalValues 6110160 entity. The TotalValues 6110160 entity includes a NetAmount 6110164 attribute.

The NetAmount 6110164 attribute is an Amount 6110168 datatype. The NetAmount 6110164 attribute has a cardinality of zero or one 6110166 meaning that for each instance of the TotalValues 6110160 entity there may be one NetAmount 6110164 attribute.

The Log 6110170 package is a Log 6110176 datatype. The Log 6110170 package includes a Log 6110172 entity.

The Log 6110172 entity has a cardinality of one 6110174 meaning that for each instance of the SalesOrderBasicDataByBuyerAndIncompletenessResponseMessage_sync 611002 entity there is one Log 6110172 entity.

Message Data Type

FIGS. 613-1 through 613-4 show a SalesOrderBasicDataByBuyerAndInvoicingBlockedResponseMessage_sync 613000 package. The SalesOrderBasicDataByBuyerAndInvoicingBlockedResponseMessage_sync 613000 package is a SalesOrderBasicDataByBuyerAndInvoicingBlockedResponseMessage_sync 613004 datatype. The SalesOrderBasicDataByBuyerAndInvoicingBlockedResponseMessage_sync 613000 package includes a SalesOrderBasicDataByBuyerAndInvoicingBlockedResponseMessage_sync 613002 entity. The SalesOrderBasicDataByBuyerAndInvoicingBlockedResponseMessage_sync 613000 package includes various packages, namely SalesOrder 613020 and Log 6130170.

The SalesOrder 613020 package includes a SalesOrder 613022 entity. The SalesOrder 613020 package includes various packages, namely Party 613050, SalesTerms 6130116, DateTerms 6130146 and TotalValues 6130158.

The SalesOrder 613022 entity has a cardinality of zero to n 613024 meaning that for each instance of the SalesOrderBasicDataByBuyerAndInvoicingBlockedResponseMessage_sync 613002 entity there may be zero to n SalesOrder 613022 entities. The SalesOrder 613022 entity includes various attributes, namely ID 613026, ProcessingTypeCode 613032, ProcessingTypeName 613038 and BuyerID 613044.

The ID 613026 attribute is a SalesOrderID 613030 datatype. The ID 613026 attribute has a cardinality of one 613028 meaning that for each instance of the SalesOrder 613022 entity there is one ID 613026 attribute.

The ProcessingTypeCode 613032 attribute is a BusinessTransactionDocumentProcessingTypeCode 613036 datatype. The ProcessingTypeCode 613032 attribute has a cardinality of zero or one 613034 meaning that for each instance of the SalesOrder 613022 entity there may be one ProcessingTypeCode 613032 attribute.

The ProcessingTypeName 613038 attribute is a LEN20_Name,Qualifier:ProcessingType 613042 datatype. The ProcessingTypeName 613038 attribute has a cardinality of zero or one 613040 meaning that for each instance of the SalesOrder 613022 entity there may be one ProcessingTypeName 613038 attribute.

The BuyerID 613044 attribute is a BusinessTransactionDocumentID 613048 datatype. The BuyerID 613044 attribute has a cardinality of zero or one 613046 meaning that for each instance of the SalesOrder 613022 entity there may be one BuyerID 613044 attribute.

The Party 613050 package includes various entities, namely BuyerParty 613052, SalesOrganisationParty 613068, SalesOfficeParty 613084 and SalesGroupParty 6130100.

The BuyerParty 613052 entity has a cardinality of one 613054 meaning that for each instance of the SalesOrder 613022 entity there is one BuyerParty 613052 entity. The BuyerParty 613052 entity includes various attributes, namely InternalID 613056 and FormattedName 613062.

The InternalID 613056 attribute is a PartyInternalID 613060 datatype. The InternalID 613056 attribute has a cardinality of one 613058 meaning that for each instance of the BuyerParty 613052 entity there is one InternalID 613056 attribute.

The FormattedName 613062 attribute is a LONG_Name, Qualifier:PartyFormatted 613066 datatype. The FormattedName 613062 attribute has a cardinality of zero or one 613064 meaning that for each instance of the BuyerParty 613052 entity there may be one FormattedName 613062 attribute.

The SalesOrganisationParty 613068 entity has a cardinality of one 613070 meaning that for each instance of the SalesOrder 613022 entity there is one SalesOrganisationParty 613068 entity. The SalesOrganisationParty 613068 entity includes various attributes, namely InternalID 613072 and FormattedName 613078.

The InternalID 613072 attribute is a PartyInternalID 613076 datatype. The InternalID 613072 attribute has a cardinality of one 613074 meaning that for each instance of the SalesOrganisationParty 613068 entity there is one InternalID 613072 attribute.

The FormattedName 613078 attribute is a LONG_Name, Qualifier:PartyFormatted 613082 datatype. The FormattedName 613078 attribute has a cardinality of zero or one 613080 meaning that for each instance of the SalesOrganisationParty 613068 entity there may be one FormattedName 613078 attribute.

The SalesOfficeParty 613084 entity has a cardinality of zero or one 613086 meaning that for each instance of the SalesOrder 613022 entity there may be one SalesOfficeParty 613084 entity. The SalesOfficeParty 613084 entity includes various attributes, namely InternalID 613088 and FormattedName 613094.

The InternalID 613088 attribute is a PartyInternalID 613092 datatype. The InternalID 613088 attribute has a cardinality of one 613090 meaning that for each instance of the SalesOfficeParty 613084 entity there is one InternalID 613088 attribute.

The FormattedName 613094 attribute is a LONG_Name, Qualifier:PartyFormatted 613098 datatype. The FormattedName 613094 attribute has a cardinality of zero or one 613096 meaning that for each instance of the SalesOfficeParty 613084 entity there may be one FormattedName 613094 attribute.

The SalesGroupParty 6130100 entity has a cardinality of zero or one 6130102 meaning that for each instance of the SalesOrder 613022 entity there may be one SalesGroupParty 6130100 entity. The SalesGroupParty 6130100 entity includes various attributes, namely InternalID 6130104 and FormattedName 6130110.

The InternalID 6130104 attribute is a PartyInternalID 6130108 datatype. The InternalID 6130104 attribute has a cardinality of one 6130106 meaning that for each instance of the SalesGroupParty 6130100 entity there is one InternalID 6130104 attribute.

The FormattedName 6130110 attribute is a LONG_Name, Qualifier:PartyFormatted 6130114 datatype. The FormattedName 6130110 attribute has a cardinality of zero or one 6130112 meaning that for each instance of the SalesGroupParty 6130100 entity there may be one FormattedName 6130110 attribute.

The SalesTerms 6130116 package includes a SalesTerms 6130118 entity.

The SalesTerms 6130118 entity has a cardinality of zero or one 6130120 meaning that for each instance of the SalesOrder 613022 entity there may be one SalesTerms 6130118 entity. The SalesTerms 6130118 entity includes various attributes, namely DistributionChannelCode 6130122, DistributionChannelName 6130128, DivisionCode 6130134 and DivisionName 6130140.

The DistributionChannelCode 6130122 attribute is a DistributionChannelCode 6130126 datatype. The DistributionChannelCode 6130122 attribute has a cardinality of zero or one 6130124 meaning that for each instance of the SalesTerms 6130118 entity there may be one DistributionChannelCode 6130122 attribute.

The DistributionChannelName 6130128 attribute is a LEN20_Name,Qualifier:DistributionChannel 6130132 datatype. The DistributionChannelName 6130128 attribute has a cardinality of zero or one 6130130 meaning that for each instance of the SalesTerms 6130118 entity there may be one DistributionChannelName 6130128 attribute.

The DivisionCode 6130134 attribute is a DivisionCode 6130138 datatype. The DivisionCode 6130134 attribute has a cardinality of zero or one 6130136 meaning that for each instance of the SalesTerms 6130118 entity there may be one DivisionCode 6130134 attribute.

The DivisionName 6130140 attribute is a LEN20_Name, Qualifier:Division 6130144 datatype. The DivisionName 6130140 attribute has a cardinality of zero or one 6130142 meaning that for each instance of the SalesTerms 6130118 entity there may be one DivisionName 6130140 attribute.

The DateTerms 6130146 package includes a DateTerms 6130148 entity.

The DateTerms 6130148 entity has a cardinality of zero or one 6130150 meaning that for each instance of the SalesOrder 613022 entity there may be one DateTerms 6130148 entity. The DateTerms 6130148 entity includes a RequestDate 6130152 attribute.

The RequestDate 6130152 attribute is a Date 6130156 datatype. The RequestDate 6130152 attribute has a cardinality of zero or one 6130154 meaning that for each instance of the DateTerms 6130148 entity there may be one RequestDate 6130152 attribute.

The TotalValues 6130158 package includes a TotalValues 6130160 entity.

The TotalValues 6130160 entity has a cardinality of zero or one 6130162 meaning that for each instance of the SalesOrder 613022 entity there may be one TotalValues 6130160 entity. The TotalValues 6130160 entity includes a NetAmount 6130164 attribute.

The NetAmount 6130164 attribute is an Amount 6130168 datatype. The NetAmount 6130164 attribute has a cardinality of zero or one 6130166 meaning that for each instance of the TotalValues 6130160 entity there may be one NetAmount 6130164 attribute.

The Log 6130170 package is a Log 6130176 datatype. The Log 6130170 package includes a Log 6130172 entity.

The Log 6130172 entity has a cardinality of one 6130174 meaning that for each instance of the SalesOrderBasicDataByBuyerAndInvoicingBlockedResponseMessage_sync 613002 entity there is one Log 6130172 entity.

Message Data Type

FIG. 616 shows a SalesOrderCreateConfirmationMessage_sync 616000 package. The SalesOrderCreateConfirmationMessage_sync 616000 package is a SalesOrderCreateConfirmationMessage_sync 616004 datatype. The SalesOrderCreateConfirmationMessage_sync 616000 package includes a SalesOrderCreateConfirmationMessage_sync 616002 entity. The SalesOrderCreateConfirmationMessage_sync 616000 package includes various packages, namely SalesOrder 616020 and Log 616032.

The SalesOrder 616020 package includes a SalesOrder 616022 entity.

The SalesOrder 616022 entity has a cardinality of zero or one 616024 meaning that for each instance of the SalesOrderCreateConfirmationMessage_sync 616002 entity there may be one SalesOrder 616022 entity. The SalesOrder 616022 entity includes an ID 616026 attribute.

The ID 616026 attribute is a SalesOrderID 616030 datatype. The ID 616026 attribute has a cardinality of one 616028 meaning that for each instance of the SalesOrder 616022 entity there is one ID 616026 attribute.

The Log 616032 package is a Log 616038 datatype. The Log 616032 package includes a Log 616034 entity.

The Log 616034 entity has a cardinality of one 616036 meaning that for each instance of the SalesOrderCreateConfirmationMessage_sync 616002 entity there is one Log 616034 entity.

Message Data Type

FIGS. 617-1 through 617-3 show a SalesOrderCreateRequestMessage_sync 617000 package. The SalesOrderCreateRequestMessage_sync 617000 package is a SalesOrderCreateRequestMessage_sync 617004 datatype. The SalesOrderCreateRequestMessage_sync 617000 package includes a SalesOrderCreateRequestMessage_sync 617002 entity. The SalesOrderCreateRequestMessage_sync 617000 package includes a SalesOrder 617020 package.

The SalesOrder 617020 package includes a SalesOrder 617022 entity. The SalesOrder 617020 package includes various packages, namely Party 617044, SalesTerms 617066, DateTerms 617084 and Item 617096.

The SalesOrder 617022 entity has a cardinality of one 617024 meaning that for each instance of the SalesOrderCreateRequestMessage_sync 617002 entity there is one SalesOrder 617022 entity. The SalesOrder 617022 entity includes various attributes, namely Date 617026, ProcessingTypeCode 617032 and BuyerID 617038.

The Date 617026 attribute is a Date 617030 datatype. The Date 617026 attribute has a cardinality of zero or one 617028 meaning that for each instance of the SalesOrder 617022 entity there may be one Date 617026 attribute.

The ProcessingTypeCode 617032 attribute is a BusinessTransactionDocumentProcessingTypeCode 617036 datatype. The ProcessingTypeCode 617032 attribute has a cardinality of one 617034 meaning that for each instance of the SalesOrder 617022 entity there is one ProcessingTypeCode 617032 attribute.

The BuyerID 617038 attribute is a BusinessTransactionDocumentID 617042 datatype. The BuyerID 617038 attribute has a cardinality of zero or one 617040 meaning that for each instance of the SalesOrder 617022 entity there may be one BuyerID 617038 attribute.

The Party 617044 package includes various entities, namely BuyerParty 617046 and SalesOrganisationParty 617056.

The BuyerParty 617046 entity has a cardinality of one 617048 meaning that for each instance of the SalesOrder 617022 entity there is one BuyerParty 617046 entity. The BuyerParty 617046 entity includes an InternalID 617050 attribute.

The InternalID 617050 attribute is a PartyInternalID 617054 datatype. The InternalID 617050 attribute has a cardinality of one 617052 meaning that for each instance of the BuyerParty 617046 entity there is one InternalID 617050 attribute.

The SalesOrganisationParty 617056 entity has a cardinality of one 617058 meaning that for each instance of the SalesOrder 617022 entity there is one SalesOrganisationParty 617056 entity. The SalesOrganisationParty 617056 entity includes an InternalID 617060 attribute.

The InternalID 617060 attribute is a PartyInternalID 617064 datatype. The InternalID 617060 attribute has a cardinality of one 617062 meaning that for each instance of the SalesOrganisationParty 617056 entity there is one InternalID 617060 attribute.

The SalesTerms 617066 package includes a SalesTerms 617068 entity.

The SalesTerms 617068 entity has a cardinality of one 617070 meaning that for each instance of the SalesOrder 617022 entity there is one SalesTerms 617068 entity. The SalesTerms 617068 entity includes various attributes, namely DistributionChannelCode 617072 and DivisionCode 617078.

The DistributionChannelCode 617072 attribute is a DistributionChannelCode 617076 datatype. The DistributionChannelCode 617072 attribute has a cardinality of one 617074 meaning that for each instance of the SalesTerms 617068 entity there is one DistributionChannelCode 617072 attribute.

The DivisionCode 617078 attribute is a DivisionCode 617082 datatype. The DivisionCode 617078 attribute has a cardinality of one 617080 meaning that for each instance of the SalesTerms 617068 entity there is one DivisionCode 617078 attribute.

The DateTerms 617084 package includes a DateTerms 617086 entity.

The DateTerms 617086 entity has a cardinality of zero or one 617088 meaning that for each instance of the SalesOrder 617022 entity there may be one DateTerms 617086 entity. The DateTerms 617086 entity includes a RequestDate 617090 attribute.

The RequestDate 617090 attribute is a Date 617094 datatype. The RequestDate 617090 attribute has a cardinality of zero or one 617092 meaning that for each instance of the DateTerms 617086 entity there may be one RequestDate 617090 attribute.

The Item 617096 package includes an Item 617098 entity. The Item 617096 package includes various packages, namely ProductInformation 6170102 and TotalValues 6170114.

The Item 617098 entity has a cardinality of zero to n 6170100 meaning that for each instance of the SalesOrder 617022 entity there may be zero to n Item 617098 entities.

The ProductInformation 6170102 package includes a Product 6170104 entity.

The Product 6170104 entity has a cardinality of one 6170106 meaning that for each instance of the Item 617098 entity there is one Product 6170104 entity. The Product 6170104 entity includes a SellerID 6170108 attribute.

The SellerID 6170108 attribute is a ProductPartyID 6170112 datatype. The SellerID 6170108 attribute has a cardinality of one 6170110 meaning that for each instance of the Product 6170104 entity there is one SellerID 6170108 attribute.

The TotalValues 6170114 package includes a TotalValues 6170116 entity.

The TotalValues 6170116 entity has a cardinality of one 6170118 meaning that for each instance of the Item 617098 entity there is one TotalValues 6170116 entity. The TotalValues 6170116 entity includes a RequestedQuantity 6170120 attribute.

The RequestedQuantity 6170120 attribute is a Quantity 6170124 datatype. The RequestedQuantity 6170120 attribute has a cardinality of one 6170122 meaning that for each instance of the TotalValues 6170116 entity there is one RequestedQuantity 6170120 attribute.

Message Data Type

FIGS. 619-1 through 619-4 show a SalesOrderMessage 619000 package. The SalesOrderMessage 619000 package is a SalesOrderItemByAccountAssignmentResponseMessage_sync 619004 datatype. The SalesOrderMessage 619000 package includes a SalesOrderMessage 619002 entity. The SalesOrderMessage 619000 package includes various packages, namely SalesOrder 619020 and Log 6190162.

The SalesOrder 619020 package includes a SalesOrder 619022 entity. The SalesOrder 619020 package includes various packages, namely Party 619044, SalesTerms 619072, PricingTerms 619090 and Item 6190102.

The SalesOrder 619022 entity has a cardinality of zero to n 619024 meaning that for each instance of the SalesOrderMessage 619002 entity there may be zero to n SalesOrder 619022 entities. The SalesOrder 619022 entity includes various attributes, namely ID 619026, Date 619032 and BuyerID 619038.

The ID 619026 attribute is a SalesOrderID 619030 datatype. The ID 619026 attribute has a cardinality of one 619028 meaning that for each instance of the SalesOrder 619022 entity there is one ID 619026 attribute.

The Date 619032 attribute is a Date 619036 datatype. The Date 619032 attribute has a cardinality of zero or one 619034 meaning that for each instance of the SalesOrder 619022 entity there may be one Date 619032 attribute.

The BuyerID 619038 attribute is a BusinessTransactionDocumentID 619042 datatype. The BuyerID 619038 attribute has a cardinality of zero or one 619040 meaning that for each instance of the SalesOrder 619022 entity there may be one BuyerID 619038 attribute.

The Party 619044 package includes various entities, namely BuyerParty 619046 and SalesOrganisationParty 619062.

The BuyerParty 619046 entity has a cardinality of one 619048 meaning that for each instance of the SalesOrder 619022 entity there is one BuyerParty 619046 entity. The BuyerParty 619046 entity includes various attributes, namely InternalID 619050 and FormattedName 619056.

The InternalID 619050 attribute is a PartyInternalID 619054 datatype. The InternalID 619050 attribute has a cardinality of one 619052 meaning that for each instance of the BuyerParty 619046 entity there is one InternalID 619050 attribute.

The FormattedName 619056 attribute is a LONG_Name, Qualifier:PartyFormatted 619060 datatype. The FormattedName 619056 attribute has a cardinality of zero or one 619058 meaning that for each instance of the BuyerParty 619046 entity there may be one FormattedName 619056 attribute.

The SalesOrganisationParty 619062 entity has a cardinality of one 619064 meaning that for each instance of the SalesOrder 619022 entity there is one SalesOrganisationParty 619062 entity. The SalesOrganisationParty 619062 entity includes an InternalID 619066 attribute.

The InternalID 619066 attribute is a PartyInternalID 619070 datatype. The InternalID 619066 attribute has a cardinality of one 619068 meaning that for each instance of the SalesOrganisationParty 619062 entity there is one InternalID 619066 attribute.

The SalesTerms 619072 package includes a SalesTerms 619074 entity.

The SalesTerms 619074 entity has a cardinality of one 619076 meaning that for each instance of the SalesOrder 619022 entity there is one SalesTerms 619074 entity. The SalesTerms 619074 entity includes various attributes, namely DistributionChannelCode 619078 and DivisionCode 619084.

The DistributionChannelCode 619078 attribute is a DistributionChannelCode 619082 datatype. The DistributionChannelCode 619078 attribute has a cardinality of one 619080 meaning that for each instance of the SalesTerms 619074 entity there is one DistributionChannelCode 619078 attribute.

The DivisionCode 619084 attribute is a DivisionCode 619088 datatype. The DivisionCode 619084 attribute has a cardinality of one 619086 meaning that for each instance of the SalesTerms 619074 entity there is one DivisionCode 619084 attribute.

The PricingTerms 619090 package includes a PricingTerms 619092 entity.

The PricingTerms 619092 entity has a cardinality of zero or one 619094 meaning that for each instance of the SalesOrder 619022 entity there may be one PricingTerms 619092 entity. The PricingTerms 619092 entity includes a CurrencyCode 619096 attribute.

The CurrencyCode 619096 attribute is a CurrencyCode 6190100 datatype. The CurrencyCode 619096 attribute has a cardinality of zero or one 619098 meaning that for each instance of the PricingTerms 619092 entity there may be one CurrencyCode 619096 attribute.

The Item 6190102 package includes an Item 6190104 entity. The Item 6190102 package includes various packages, namely ProductInformation 6190120, AccountAssignment 6190132 and TotalValues 6190144.

The Item 6190104 entity has a cardinality of one to n 6190106 meaning that for each instance of the SalesOrder 619022 entity there may be one to n Item 6190104 entities. The Item 6190104 entity includes various attributes, namely ID 6190108 and Description 6190114.

The ID 6190108 attribute is a SalesOrderItemID 6190112 datatype. The ID 6190108 attribute has a cardinality of one 6190110 meaning that for each instance of the Item 6190104 entity there is one ID 6190108 attribute.

The Description 6190114 attribute is a SHORT_Description 6190118 datatype. The Description 6190114 attribute has a cardinality of zero or one 6190116 meaning that for each instance of the Item 6190104 entity there may be one Description 6190114 attribute.

The ProductInformation 6190120 package includes a Product 6190122 entity.

The Product 6190122 entity has a cardinality of zero or one 6190124 meaning that for each instance of the Item 6190104 entity there may be one Product 6190122 entity. The Product 6190122 entity includes a SellerID 6190126 attribute.

The SellerID 6190126 attribute is a ProductPartyID 6190130 datatype. The SellerID 6190126 attribute has a cardinality of one 6190128 meaning that for each instance of the Product 6190122 entity there is one SellerID 6190126 attribute.

The AccountAssignment 6190132 package includes an AccountAssignment 6190134 entity.

The AccountAssignment 6190134 entity has a cardinality of one 6190136 meaning that for each instance of the Item 6190104 entity there is one AccountAssignment 6190134 entity. The AccountAssignment 6190134 entity includes a ProjectWorkBreakdownStructureElementID 6190138 attribute.

The ProjectWorkBreakdownStructureElementID 6190138 attribute is a ProjectWorkBreakdownStructureElementID 6190142 datatype. The ProjectWorkBreakdownStructureElementID 6190138 attribute has a cardinality of one 6190140 meaning that for each instance of the AccountAssignment 6190134 entity there is one ProjectWorkBreakdownStructureElementID 6190138 attribute.

The TotalValues 6190144 package includes a TotalValues 6190146 entity.

The TotalValues 6190146 entity has a cardinality of zero or one 6190148 meaning that for each instance of the Item 6190104 entity there may be one TotalValues 6190146 entity. The TotalValues 6190146 entity includes various attributes, namely RequestedQuantity 6190150 and NetAmount 6190156.

The RequestedQuantity 6190150 attribute is a Quantity 6190154 datatype. The RequestedQuantity 6190150 attribute has a cardinality of zero or one 6190152 meaning that for each instance of the TotalValues 6190146 entity there may be one RequestedQuantity 6190150 attribute.

The NetAmount 6190156 attribute is an Amount 6190160 datatype. The NetAmount 6190156 attribute has a cardinality of zero or one 6190158 meaning that for each instance of the TotalValues 6190146 entity there may be one NetAmount 6190156 attribute.

The Log 6190162 package is a Log 6190168 datatype. The Log 6190162 package includes a Log 6190164 entity.

The Log 6190164 entity has a cardinality of one 6190166 meaning that for each instance of the SalesOrderMessage 619002 entity there is one Log 6190164 entity.

Message Data Type

FIGS. 621-1 through 621-4 show a SalesOrderItemByBuyerAndProductResponseMessage_sync 621000 package. The SalesOrderItemByBuyerAndProductResponseMessage_sync 621000 package is a SalesOrderItemByBuyerAndProductResponseMessage_sync 621004 datatype. The SalesOrderItemByBuyerAndProductResponseMessage_sync 621000 package includes a SalesOrderItemByBuyerAndProductResponseMessage_sync 621002 entity. The SalesOrderItemByBuyerAndProductResponseMessage_sync 621000 package includes various packages, namely SalesOrder 621020 and Log 6210150.

The SalesOrder 621020 package includes a SalesOrder 621022 entity. The SalesOrder 621020 package includes various packages, namely Party 621044, SalesTerms 621072, PricingTerms 621090 and Item 6210102.

The SalesOrder 621022 entity has a cardinality of zero to n 621024 meaning that for each instance of the SalesOrderItemByBuyerAndProductResponseMessage_sync 621002 entity there may be zero to n SalesOrder 621022 entities. The SalesOrder 621022 entity includes various attributes, namely ID 621026, Date 621032 and BuyerID 621038.

The ID 621026 attribute is a SalesOrderID 621030 datatype. The ID 621026 attribute has a cardinality of one 621028 meaning that for each instance of the SalesOrder 621022 entity there is one ID 621026 attribute.

The Date 621032 attribute is a Date 621036 datatype. The Date 621032 attribute has a cardinality of zero or one 621034 meaning that for each instance of the SalesOrder 621022 entity there may be one Date 621032 attribute.

The BuyerID 621038 attribute is a BusinessTransactionDocumentID 621042 datatype. The BuyerID 621038 attribute has a cardinality of zero or one 621040 meaning that for each instance of the SalesOrder 621022 entity there may be one BuyerID 621038 attribute.

The Party 621044 package includes various entities, namely BuyerParty 621046 and SalesOrganisationParty 621062.

The BuyerParty 621046 entity has a cardinality of one 621048 meaning that for each instance of the SalesOrder 621022 entity there is one BuyerParty 621046 entity. The BuyerParty 621046 entity includes various attributes, namely InternalID 621050 and FormattedName 621056.

The InternalID 621050 attribute is a PartyInternalID 621054 datatype. The InternalID 621050 attribute has a cardinality of one 621052 meaning that for each instance of the BuyerParty 621046 entity there is one InternalID 621050 attribute.

The FormattedName 621056 attribute is a LONG_Name, Qualifier:PartyFormatted 621060 datatype. The FormattedName 621056 attribute has a cardinality of zero or one 621058 meaning that for each instance of the BuyerParty 621046 entity there may be one FormattedName 621056 attribute.

The SalesOrganisationParty 621062 entity has a cardinality of one 621064 meaning that for each instance of the SalesOrder 621022 entity there is one SalesOrganisationParty 621062 entity. The SalesOrganisationParty 621062 entity includes an InternalID 621066 attribute.

The InternalID 621066 attribute is a PartyInternalID 621070 datatype. The InternalID 621066 attribute has a cardinality of one 621068 meaning that for each instance of the SalesOrganisationParty 621062 entity there is one InternalID 621066 attribute.

The SalesTerms 621072 package includes a SalesTerms 621074 entity.

The SalesTerms 621074 entity has a cardinality of one 621076 meaning that for each instance of the SalesOrder 621022 entity there is one SalesTerms 621074 entity. The SalesTerms 621074 entity includes various attributes, namely DistributionChannelCode 621078 and DivisionCode 621084.

The DistributionChannelCode 621078 attribute is a DistributionChannelCode 621082 datatype. The DistributionChannelCode 621078 attribute has a cardinality of one 621080 meaning that for each instance of the SalesTerms 621074 entity there is one DistributionChannelCode 621078 attribute.

The DivisionCode 621084 attribute is a DivisionCode 621088 datatype. The DivisionCode 621084 attribute has a cardinality of one 621086 meaning that for each instance of the SalesTerms 621074 entity there is one DivisionCode 621084 attribute.

The PricingTerms 621090 package includes a PricingTerms 621092 entity.

The PricingTerms 621092 entity has a cardinality of zero or one 621094 meaning that for each instance of the SalesOrder 621022 entity there may be one PricingTerms 621092 entity. The PricingTerms 621092 entity includes a CurrencyCode 621096 attribute.

The CurrencyCode 621096 attribute is a CurrencyCode 6210100 datatype. The CurrencyCode 621096 attribute has a cardinality of zero or one 621098 meaning that for each instance of the PricingTerms 621092 entity there may be one CurrencyCode 621096 attribute.

The Item 6210102 package includes an Item 6210104 entity. The Item 6210102 package includes various packages, namely ProductInformation 6210120 and TotalValues 6210132.

The Item 6210104 entity has a cardinality of one to n 6210106 meaning that for each instance of the SalesOrder 621022 entity there may be one to n Item 6210104 entities. The Item 6210104 entity includes various attributes, namely ID 6210108 and Description 6210114.

The ID 6210108 attribute is a SalesOrderItemID 6210112 datatype. The ID 6210108 attribute has a cardinality of one 6210110 meaning that for each instance of the Item 6210104 entity there is one ID 6210108 attribute.

The Description 6210114 attribute is a SHORT_Description 6210118 datatype. The Description 6210114 attribute has a cardinality of zero or one 6210116 meaning that for each instance of the Item 6210104 entity there may be one Description 6210114 attribute.

The ProductInformation 6210120 package includes a Product 6210122 entity.

The Product 6210122 entity has a cardinality of one 6210124 meaning that for each instance of the Item 6210104 entity there is one Product 6210122 entity. The Product 6210122 entity includes a SellerID 6210126 attribute.

The SellerID 6210126 attribute is a ProductPartyID 6210130 datatype. The SellerID 6210126 attribute has a cardinality of one 6210128 meaning that for each instance of the Product 6210122 entity there is one SellerID 6210126 attribute.

The TotalValues 6210132 package includes a TotalValues 6210134 entity.

The TotalValues 6210134 entity has a cardinality of zero or one 6210136 meaning that for each instance of the Item 6210104 entity there may be one TotalValues 6210134 entity. The TotalValues 6210134 entity includes various attributes, namely RequestedQuantity 6210138 and NetAmount 6210144.

The RequestedQuantity 6210138 attribute is a Quantity 6210142 datatype. The RequestedQuantity 6210138 attribute has a cardinality of zero or one 6210140 meaning that for each instance of the TotalValues 6210134 entity there may be one RequestedQuantity 6210138 attribute.

The NetAmount 6210144 attribute is an Amount 6210148 datatype. The NetAmount 6210144 attribute has a cardinality of zero or one 6210146 meaning that for each instance of the TotalValues 6210134 entity there may be one NetAmount 6210144 attribute.

The Log 6210150 package is a Log 6210156 datatype. The Log 6210150 package includes a Log 6210152 entity.

The Log 6210152 entity has a cardinality of one 6210154 meaning that for each instance of the SalesOrderItemByBuyerAndProductResponseMessage_sync 621002 entity there is one Log 6210152 entity.

Message Data Type

FIGS. 623-1 through 623-5 show a SalesOrderItemByIDResponseMessage_sync 623000 package. The SalesOrderItemByIDResponseMessage_sync 623000 package is a SalesOrderItemByIDResponseMessage_sync 623004 datatype. The SalesOrderItemByIDResponseMessage_sync 623000 package includes various entities, namely SalesOrderItemByIDResponseMessage_sync 623002 and 60 623098. The SalesOrderItemByIDResponseMessage_sync 623000 package includes various packages, namely SalesOrder 623020 and Log 6230190.

The SalesOrder 623020 package includes a SalesOrder 623022 entity. The SalesOrder 623020 package includes various packages, namely Party 623032, Party 623050, SalesTerms 623062, DateTerms 623080 and Item 623092.

The SalesOrder 623022 entity has a cardinality of zero or one 623024 meaning that for each instance of the SalesOrderItemByIDResponseMessage_sync 623002 entity there may be one SalesOrder 623022 entity. The SalesOrder 623022 entity includes an ID 623026 attribute.

The ID 623026 attribute is a SalesOrderID 623030 datatype. The ID 623026 attribute has a cardinality of one 623028 meaning that for each instance of the SalesOrder 623022 entity there is one ID 623026 attribute.

The Party 623032 package includes a BuyerParty 623034 entity.

The BuyerParty 623034 entity has a cardinality of one 623036 meaning that for each instance of the SalesOrder 623022 entity there is one BuyerParty 623034 entity. The BuyerParty 623034 entity includes various attributes, namely InternalID 623038 and FormattedName 623044.

The InternalID 623038 attribute is a PartyInternalID 623042 datatype. The InternalID 623038 attribute has a cardinality of one 623040 meaning that for each instance of the BuyerParty 623034 entity there is one InternalID 623038 attribute.

The FormattedName 623044 attribute is a LONG_Name, Qualifier:PartyFormatted 623048 datatype. The FormattedName 623044 attribute has a cardinality of zero or one 623046 meaning that for each instance of the BuyerParty 623034 entity there may be one FormattedName 623044 attribute.

The Party 623050 package includes a SalesOrganisationParty 623052 entity.

The SalesOrganisationParty 623052 entity has a cardinality of one 623054 meaning that for each instance of the SalesOrder 623022 entity there is one SalesOrganisationParty 623052 entity. The SalesOrganisationParty 623052 entity includes an InternalID 623056 attribute.

The InternalID 623056 attribute is a PartyInternalID 623060 datatype. The InternalID 623056 attribute has a cardinality of one 623058 meaning that for each instance of the SalesOrganisationParty 623052 entity there is one InternalID 623056 attribute.

The SalesTerms 623062 package includes a SalesTerms 623064 entity.

The SalesTerms 623064 entity has a cardinality of zero or one 623066 meaning that for each instance of the SalesOrder 623022 entity there may be one SalesTerms 623064 entity. The SalesTerms 623064 entity includes various attributes, namely DistributionChannelCode 623068 and DivisionCode 623074.

The DistributionChannelCode 623068 attribute is a DistributionChannelCode 623072 datatype. The DistributionChannelCode 623068 attribute has a cardinality of zero or one 623070 meaning that for each instance of the SalesTerms 623064 entity there may be one DistributionChannelCode 623068 attribute.

The DivisionCode 623074 attribute is a DivisionCode 623078 datatype. The DivisionCode 623074 attribute has a cardinality of zero or one 623076 meaning that for each instance of the SalesTerms 623064 entity there may be one DivisionCode 623074 attribute.

The DateTerms 623080 package includes a DateTerms 623082 entity.

The DateTerms 623082 entity has a cardinality of zero or one 623084 meaning that for each instance of the SalesOrder 623022 entity there may be one DateTerms 623082 entity. The DateTerms 623082 entity includes a RequestDate 623086 attribute.

The RequestDate 623086 attribute is a Date 623090 datatype. The RequestDate 623086 attribute has a cardinality of zero or one 623088 meaning that for each instance of the DateTerms 623082 entity there may be one RequestDate 623086 attribute.

The Item 623092 package includes an Item 623094 entity. The Item 623092 package includes various packages, namely ProductInformation 6230112, DeliveryTerms 6230124 and TotalValues 6230142.

The Item 623094 entity has a cardinality of zero or one 623096 meaning that for each instance of the SalesOrder 623022 entity there may be one Item 623094 entity. The Item 623094 entity includes various attributes, namely ID 6230100 and Description 6230106.

The ID 6230100 attribute is a SalesOrderItemID 6230104 datatype. The ID 6230100 attribute has a cardinality of one 6230102 meaning that for each instance of the Item 623094 entity there is one ID 6230100 attribute.

The Description 6230106 attribute is a SHORT_Description 6230110 datatype. The Description 6230106 attribute has a cardinality of zero or one 6230108 meaning that for each instance of the Item 623094 entity there may be one Description 6230106 attribute.

The ProductInformation 6230112 package includes a Product 6230114 entity.

The Product 6230114 entity has a cardinality of zero or one 6230116 meaning that for each instance of the Item 623094 entity there may be one Product 6230114 entity. The Product 6230114 entity includes a SellerID 6230118 attribute.

The SellerID 6230118 attribute is a ProductPartyID 6230122 datatype. The SellerID 6230118 attribute has a cardinality of one 6230120 meaning that for each instance of the Product 6230114 entity there is one SellerID 6230118 attribute.

The DeliveryTerms 6230124 package includes a DeliveryTerms 6230126 entity.

The DeliveryTerms 6230126 entity has a cardinality of zero or one 6230128 meaning that for each instance of the Item 623094 entity there may be one DeliveryTerms 6230126 entity. The DeliveryTerms 6230126 entity includes various attributes, namely DeliveryPriorityValue 6230130 and Incoterms 6230136.

The DeliveryPriorityValue 6230130 attribute is a PriorityValue 6230134 datatype. The DeliveryPriorityValue 6230130 attribute has a cardinality of zero or one 6230132 meaning that for each instance of the DeliveryTerms 6230126 entity there may be one DeliveryPriorityValue 6230130 attribute.

The Incoterms 6230136 attribute is an Incoterms 6230140 datatype. The Incoterms 6230136 attribute has a cardinality of zero or one 6230138 meaning that for each instance of the DeliveryTerms 6230126 entity there may be one Incoterms 6230136 attribute.

The TotalValues 6230142 package includes a TotalValues 6230144 entity.

The TotalValues 6230144 entity has a cardinality of zero or one 6230146 meaning that for each instance of the Item 623094 entity there may be one TotalValues 6230144 entity. The TotalValues 6230144 entity includes various attributes, namely RequestedQuantity 6230148, ConfirmedQuantity 6230154, GrossWeightMeasure 6230160, NetWeightMeasure 6230166, VolumeMeasure 6230172, NetAmount 6230178 and NetPrice 6230184.

The RequestedQuantity 6230148 attribute is a Quantity 6230152 datatype. The RequestedQuantity 6230148 attribute has a cardinality of zero or one 6230150 meaning that for each instance of the TotalValues 6230144 entity there may be one RequestedQuantity 6230148 attribute.

The ConfirmedQuantity 6230154 attribute is a Quantity 6230158 datatype. The ConfirmedQuantity 6230154 attribute has a cardinality of zero or one 6230156 meaning that for each instance of the TotalValues 6230144 entity there may be one ConfirmedQuantity 6230154 attribute.

The GrossWeightMeasure 6230160 attribute is a Measure 6230164 datatype. The GrossWeightMeasure 6230160 attribute has a cardinality of zero or one 6230162 meaning that for each instance of the TotalValues 6230144 entity there may be one GrossWeightMeasure 6230160 attribute.

The NetWeightMeasure 6230166 attribute is a Measure 6230170 datatype. The NetWeightMeasure 6230166 attribute has a cardinality of zero or one 6230168 meaning that for each instance of the TotalValues 6230144 entity there may be one NetWeightMeasure 6230166 attribute.

The VolumeMeasure 6230172 attribute is a Measure 6230176 datatype. The VolumeMeasure 6230172 attribute has a cardinality of zero or one 6230174 meaning that for each instance of the TotalValues 6230144 entity there may be one VolumeMeasure 6230172 attribute.

The NetAmount 6230178 attribute is an Amount 6230182 datatype. The NetAmount 6230178 attribute has a cardinality of zero or one 6230180 meaning that for each instance of the TotalValues 6230144 entity there may be one NetAmount 6230178 attribute.

The NetPrice 6230184 attribute is a Price 6230188 datatype. The NetPrice 6230184 attribute has a cardinality of zero or one 6230186 meaning that for each instance of the TotalValues 6230144 entity there may be one NetPrice 6230184 attribute.

The Log 6230190 package is a Log 6230196 datatype. The Log 6230190 package includes a Log 6230192 entity.

The Log 6230192 entity has a cardinality of one 6230194 meaning that for each instance of the 60 623098 entity there is one Log 6230192 entity.

Message Data Type

FIGS. 624-1 through 624-2 show a SalesOrderItemScheduleLineChangeConfirmationMessage_sync 624000 package. The SalesOrderItemScheduleLineChangeConfirmationMessage_sync 624000 package is a SalesOrderItemScheduleLineChangeConfirmationMessage_sync 624004 datatype. The SalesOrderItemScheduleLineChangeConfirmationMessage_sync 624000 package includes a SalesOrderItemScheduleLineChangeConfirmationMessage_sync 624002 entity. The SalesOrderItemScheduleLineChangeConfirmationMessage_sync 624000 package includes various packages, namely SalesOrder 624020 and Log 624056.

The SalesOrder 624020 package includes a SalesOrder 624022 entity. The SalesOrder 624020 package includes an Item 624032 package.

The SalesOrder 624022 entity has a cardinality of zero or one 624024 meaning that for each instance of the SalesOrderItemScheduleLineChangeConfirmationMessage_sync 624002 entity there may be one SalesOrder 624022 entity. The SalesOrder 624022 entity includes an ID 624026 attribute.

The ID 624026 attribute is a SalesOrderID 624030 datatype. The ID 624026 attribute has a cardinality of one 624028 meaning that for each instance of the SalesOrder 624022 entity there is one ID 624026 attribute.

The Item 624032 package includes an Item 624034 entity. The Item 624032 package includes a ScheduleLine 624044 package.

The Item 624034 entity has a cardinality of zero or one 624036 meaning that for each instance of the SalesOrder 624022 entity there may be one Item 624034 entity. The Item 624034 entity includes an ID 624038 attribute.

The ID 624038 attribute is a SalesOrderItemID 624042 datatype. The ID 624038 attribute has a cardinality of one 624040 meaning that for each instance of the Item 624034 entity there is one ID 624038 attribute.

The ScheduleLine 624044 package includes a ScheduleLine 624046 entity.

The ScheduleLine 624046 entity has a cardinality of zero or one 624048 meaning that for each instance of the Item 624034 entity there may be one ScheduleLine 624046 entity. The ScheduleLine 624046 entity includes an ID 624050 attribute.

The ID 624050 attribute is a BusinessTransactionDocumentItemScheduleLineID 624054 datatype. The ID 624050 attribute has a cardinality of one 624052 meaning that for each instance of the ScheduleLine 624046 entity there is one ID 624050 attribute.

The Log 624056 package is a Log 624062 datatype. The Log 624056 package includes a Log 624058 entity.

The Log 624058 entity has a cardinality of one 624060 meaning that for each instance of the SalesOrderItemScheduleLineChangeConfirmationMessage_sync 624002 entity there is one Log 624058 entity.

Message Data Type

FIGS. 625-1 through 625-2 show a SalesOrderItemScheduleLineChangeRequestMessage_sync 625000 package. The SalesOrderItemScheduleLineChangeRequestMessage_sync 625000 package is a SalesOrderItemScheduleLineChangeRequestMessage_sync 625004 datatype. The SalesOrderItemScheduleLineChangeRequestMessage_sync 625000 package includes a SalesOrderItemScheduleLineChangeRequestMessage_sync 625002 entity. The SalesOrderItemScheduleLineChangeRequestMessage_sync 625000 package includes a SalesOrder 625020 package.

The SalesOrder 625020 package includes a SalesOrder 625022 entity. The SalesOrder 625020 package includes an Item 625032 package.

The SalesOrder 625022 entity has a cardinality of one 625024 meaning that for each instance of the SalesOrderItemScheduleLineChangeRequestMessage_sync 625002 entity there is one SalesOrder 625022 entity. The SalesOrder 625022 entity includes an ID 625026 attribute.

The ID 625026 attribute is a SalesOrderID 625030 datatype. The ID 625026 attribute has a cardinality of one 625028 meaning that for each instance of the SalesOrder 625022 entity there is one ID 625026 attribute.

The Item 625032 package includes an Item 625034 entity. The Item 625032 package includes a ScheduleLine 625044 package.

The Item 625034 entity has a cardinality of one 625036 meaning that for each instance of the SalesOrder 625022 entity there is one Item 625034 entity. The Item 625034 entity includes an ID 625038 attribute.

The ID 625038 attribute is a SalesOrderItemID 625042 datatype. The ID 625038 attribute has a cardinality of one 625040 meaning that for each instance of the Item 625034 entity there is one ID 625038 attribute.

The ScheduleLine 625044 package includes a ScheduleLine 625046 entity.

The ScheduleLine 625046 entity has a cardinality of one 625048 meaning that for each instance of the Item 625034 entity there is one ScheduleLine 625046 entity. The ScheduleLine 625046 entity includes various attributes, namely ID 625050, Date 625056, RequestedQuantity 625062 and DeliveryBlockingReasonCode 625068.

The ID 625050 attribute is a BusinessTransactionDocumentItemScheduleLineID 625054 datatype. The ID 625050 attribute has a cardinality of one 625052 meaning that for each instance of the ScheduleLine 625046 entity there is one ID 625050 attribute.

The Date 625056 attribute is a Date 625060 datatype. The Date 625056 attribute has a cardinality of zero or one 625058 meaning that for each instance of the ScheduleLine 625046 entity there may be one Date 625056 attribute.

The RequestedQuantity 625062 attribute is a Quantity 625066 datatype. The RequestedQuantity 625062 attribute has a cardinality of zero or one 625064 meaning that for each instance of the ScheduleLine 625046 entity there may be one RequestedQuantity 625062 attribute.

The DeliveryBlockingReasonCode 625068 attribute is a BlockingReasonCode 625072 datatype. The DeliveryBlockingReasonCode 625068 attribute has a cardinality of zero or one 625070 meaning that for each instance of the ScheduleLine 625046 entity there may be one DeliveryBlockingReasonCode 625068 attribute.

StockTransportPlanningOrder Interfaces

In the supply chain planning process the Supply Chain Planner needs to model the goods movements between the locations in the location network. To plan the transportation of a certain quantity of a product from the stock of a source location to a target location at a definite time, the Supply Chain Planner uses Stock Transport Planning Orders. The Supply Chain Planner creates changes or deletes Stock Transport Planning Orders in the Supply and Demand Matching process component.

Message Choreography

The message choreography of FIG. 627 describes a possible logical sequence of messages that can be used to realize a stock transport planning order business scenario.

A StockTransportPlanningOrderCreateRequest_sync is a request to Supply and Demand Matching to create a stock transport planning order. The structure of the message type StockTransportPlanningOrderCreateRequest_sync is specified by the message data type StockTransportPlanningOrderCreateRequestMessage_sync.

A StockTransportPlanningOrderCreateConfirmation_sync is a response from Supply And Demand Matching to StockTransportPlanningOrderCreateRequest_sync. The structure of the message type StockTransportPlanningOrderCreateConfirmation_sync is specified by the message data type StockTransportPlanningOrderCreateConfirmationMessage_sync.

A StockTransportPlanningOrderChangeRequest_sync is a request to Supply and Demand Matching to change a stock transport planning order. The structure of the message type StockTransportPlanningOrderChangeRequest_sync is specified by the message data type StockTransportPlanningOrderChangeRequestMessage_sync.

A StockTransportPlanningOrderChangeConfirmation_sync is a response from Supply And Demand Matching to StockTransportPlanningOrderChangeRequest_sync. The structure of the message type StockTransportPlanningOrderChangeConfirmation_sync is specified by the message data type StockTransportPlanningOrderChangeConfirmationMessage_sync.

A StockTransportPlanningOrderCancelRequest_sync is a request to Supply and Demand Matching to cancel a stock transport planning order. The structure of the message type StockTransportPlanningOrderCancelRequest_sync is specified by the message data type StockTransportPlanningOrderCancelRequestMessage_sync.

A StockTransportPlanningOrderCancelConfirmation_sync is a response from Supply And Demand Matching to StockTransportPlanningOrderCancelRequest_sync. The structure of the message type StockTransportPlanningOrderCancelConfirmation_sync is specified by the message data type StockTransportPlanningOrderCancelConfirmationMessage_sync.

A StockTransportPlanningOrderByIDQuery_sync is an inquiry to Supply and Demand Matching for one specific stock transport planning order. The structure of the message type StockTransportPlanningOrderByIDQuery_sync is specified by the message data type StockTransportPlanningOrderByIDQueryMessage_sync.

A StockTransportPlanningOrderByIDResponse_sync is a response from Supply And Demand Matching to StockTransportPlanningOrderByIDRequest_sync. The structure of the message type Stock TransportPlanningOrderByIDResponse_sync is specified by the message data type StockTransportPlanningOrderByIDResponseMessage_sync.

A StockTransportPlanningOrderByElementsQuery_sync is an inquiry to Supply and Demand Matching to get stock transport planning orders satisfying the selection criteria. The structure of the message type StockTransportPlanningOrderByElementsQuery_sync is specified by the message data type StockTransportPlanningOrderByElementsQueryMessage_sync.

A StockTransportPlanningOrderByElementsResponse_sync is a response from Supply And Demand Matching to StockTransportPlanningOrderByElementsRequest_sync. The structure of the message type StockTransportPlanningOrderByElementsResponse_sync is specified by the message data type StockTransportPlanningOrderByElementsResponseMessage_sync.

For example, a "Supply Chain Planner" system 627002 can request to create a stock transport planning order using the StockTransportPlanningOrderCreateRequest_sync message 627006 as shown, for example, in FIG. 637. A "Supply and Demand Matching" system 627004 can confirm the creation request using the StockTransportPlanningOrderCreateConfirmation_sync message 627008 as shown, for example, in FIG. 636. The "Supply Chain Planner" system 627002 can request to change a stock transport planning order using the StockTransportPlanningOrderChangeRequest_sync message 627010 as shown, for example, in FIG. 635. The "Supply and Demand Matching" system 627004 can confirm the change request using the StockTransportPlanningOrderChangeConfirmation_sync message 627012 as shown, for example, in FIG. 634. The "Supply Chain Planner" system 627002 can request to cancel a stock transport planning order using the StockTransportPlanningOrderCancelRequest_sync message 627014 as shown, for example, in FIG. 633. The "Supply and Demand Matching" system 627004 can confirm the cancellation request using the StockTransportPlanningOrderCancelConfirmation_sync message 627016 as shown, for example, in FIG. 632. The "Supply Chain Planner" system 627002 can query stock transport planning orders by ID using the StockTransportPlanningOrderByIDQuery__sync message 627018 as shown, for example, in FIG. 630. The "Supply and Demand Matching" system 627004 can respond to the query using the StockTransportPlanningOrderByIDResponse_sync message 627020 as shown, for example, in FIG. 631. The "Supply Chain Planner" system 627002 can query stock transport planning orders by elements using the StockTransportPlanningOrderByElementsQuery_sync message 627022 as shown, for example, in FIG. 628. The "Supply and Demand Matching" system 627004 can respond to the query using the StockTransportPlanningOrderByElementsResponse_sync message 627024 as shown, for example, in FIG. 629.

Message Data Type

The message data type StockTransportPlanningOrderCreateRequestMessage_sync contains the StockTransportPlanningOrder included in the business document and the business information that is relevant for sending a business document in a message. FIGS. 647-1 through 647-6 show a StockTransportPlanningOrderCreateRequestMessage_sync 647000 package. The StockTransportPlanningOrderCreateRequestMessage_sync 647000 package is a StockTransportPlanningOrderCreateRequestMessage_sync 647004 datatype. The StockTransportPlanningOrderCreateRequestMessage_sync 647000 package includes a StockTransportPlanningOrderCreateRequestMessage_sync 647002 entity. The StockTransportPlanningOrderCreateRequestMessage_sync 647000 package includes various packages, namely MessageHeader 647006 and StockTransportPlanningOrder 6470116.

The MessageHeader 647006 package is a BusinessDocumentMessageHeader 647012 datatype. The MessageHeader 647006 package includes a MessageHeader 647008 entity.

The MessageHeader 647008 entity has a cardinality of one 647010 meaning that for each instance of the StockTransportPlanningOrderCreateRequestMessage_sync 647002 entity there is one MessageHeader 647008 entity. The MessageHeader 647008 entity includes various attributes, namely ID 647014, ReferenceID 647020, CreationDateTime 647026, TestDataIndicator 647032, ReconciliationIndicator 647038 and SenderParty 647044.

The ID 647014 attribute is a BusinessDocumentMessageID 647018 datatype. The ID 647014 attribute has a cardinality of one 647016 meaning that for each instance of the MessageHeader 647008 entity there is one ID 647014 attribute.

The ReferenceID 647020 attribute is a BusinessDocumentMessageID 647024 datatype. The ReferenceID 647020 attribute has a cardinality of zero or one 647022 meaning that for each instance of the MessageHeader 647008 entity there may be one ReferenceID 647020 attribute.

The CreationDateTime 647026 attribute is a GLOBAL_DateTime 647030 datatype. The CreationDateTime 647026 attribute has a cardinality of one 647028 meaning that for each instance of the MessageHeader 647008 entity there is one CreationDateTime 647026 attribute.

The TestDataIndicator 647032 attribute is an Indicator 647036 datatype. The TestDataIndicator 647032 attribute has a cardinality of zero or one 647034 meaning that for each instance of the MessageHeader 647008 entity there may be one TestDataIndicator 647032 attribute.

The ReconciliationIndicator 647038 attribute is an Indicator 647042 datatype. The ReconciliationIndicator 647038 attribute has a cardinality of zero or one 647040 meaning that for each instance of the MessageHeader 647008 entity there may be one ReconciliationIndicator 647038 attribute.

The SenderParty 647044 attribute is a BusinessDocumentMessageHeaderParty 647048 datatype. The SenderParty 647044 attribute has a cardinality of zero or one 647046 meaning that for each instance of the MessageHeader 647008 entity there may be one SenderParty 647044 attribute.

The StockTransportPlanningOrder 6470116 package includes a StockTransportPlanningOrder 6470118 entity. The StockTransportPlanningOrder 6470116 package includes a StockTransportPlanningOrderItem 6470128 package.

The StockTransportPlanningOrder 6470118 entity has a cardinality of one 6470120 meaning that for each instance of the StockTransportPlanningOrderCreateRequestMessage_sync 647002 entity there is one StockTransportPlanningOrder 6470118 entity. The StockTransportPlanningOrder 6470118 entity includes a PlanningVersionID 6470122 attribute.

The PlanningVersionID 6470122 attribute is a PlanningVersionID 6470126 datatype. The PlanningVersionID 6470122 attribute has a cardinality of one 6470124 meaning that for each instance of the StockTransportPlanningOrder 6470118 entity there is one PlanningVersionID 6470122 attribute.

The StockTransportPlanningOrderItem 6470128 package includes a StockTrans-portPlanningOrderItem 6470130 entity. The StockTransportPlanningOrderItem 6470128 package includes a StockTransportPlanningOrderItemScheduleLine 6470158 package.

The StockTransportPlanningOrderItem 6470130 entity has a cardinality of one 6470132 meaning that for each instance of the StockTransportPlanningOrder 6470118 entity there is one StockTransportPlanningOrderItem 6470130 entity. The StockTransportPlanningOrderItem 6470130 entity includes various attributes, namely ProductInternalID 6470134, TargetLocationInternalID 6470140, SourceLocationInternalID 6470146 and TransportMeansDescriptionCode 6470152.

The ProductInternalID 6470134 attribute is a ProductInternalID 6470138 datatype. The ProductInternalID 6470134 attribute has a cardinality of one 6470136 meaning that for each instance of the StockTransportPlanningOrderItem 6470130 entity there is one ProductInternalID 6470134 attribute.

The TargetLocationInternalID 6470140 attribute is a LocationInternalID 6470144 datatype. The TargetLocationInternalID 6470140 attribute has a cardinality of one 6470142 meaning that for each instance of the StockTransportPlanningOrderItem 6470130 entity there is one TargetLocationInternalID 6470140 attribute.

The SourceLocationInternalID 6470146 attribute is a LocationInternalID 6470150 datatype. The SourceLocationInternalID 6470146 attribute has a cardinality of one 6470148 meaning that for each instance of the StockTransportPlanningOrderItem 6470130 entity there is one SourceLocationInternalID 6470146 attribute.

The TransportMeansDescriptionCode 6470152 attribute is a TransportMeansDescriptionCode 6470156 datatype. The TransportMeansDescriptionCode 6470152 attribute has a cardinality of one 6470154 meaning that for each instance of the StockTransportPlanningOrderItem 6470130 entity there is one TransportMeansDescriptionCode 6470152 attribute.

The StockTransportPlanningOrderItemScheduleLine 6470158 package includes a StockTransportPlanningOrderItemScheduleLine 6470160 entity.

The StockTransportPlanningOrderItemScheduleLine 6470160 entity has a cardinality of one 6470162 meaning that for each instance of the StockTransportPlanningOrderItem 6470130 entity there is one StockTransportPlanningOrderItemScheduleLine 6470160 entity. The StockTransportPlanningOrderItemScheduleLine 6470160 entity includes various attributes, namely Quantity 6470164, FixedIndicator 6470170 and AvailabilityDateTime 6470176.

The Quantity 6470164 attribute is a Quantity 6470168 datatype. The Quantity 6470164 attribute has a cardinality of one 6470166 meaning that for each instance of the StockTransportPlanningOrderItemScheduleLine 6470160 entity there is one Quantity 6470164 attribute.

The FixedIndicator 6470170 attribute is an Indicator 6470174 datatype. The FixedIndicator 6470170 attribute has a cardinality of one 6470172 meaning that for each instance of the StockTransportPlanningOrderItemScheduleLine 6470160 entity there is one FixedIndicator 6470170 attribute.

The AvailabilityDateTime 6470176 attribute is a GLOBAL_DateTime 6470180 datatype. The AvailabilityDateTime 6470176 attribute has a cardinality of one 6470178 meaning that for each instance of the StockTransportPlanningOrderItemScheduleLine 6470160 entity there is one AvailabilityDateTime 6470176 attribute.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. For Request or Query message data types it is of type GDT: BusinessDocumentMessageHeader, whereby various elements of the GDT are used, namely ID or UUID, CreationDateTime, and BusinessScopeBusinessProcess. For Confirmation or Response message data types it is of type GDT: BasicBusinessDocumentMessageHeader, whereby various elements of the GDT are used, namely ReferenceID or ReferenceUUID. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. The StockTransportPlanningOrder contains the element PlanningVersionID. PlanningVersionID is a unique identifier for a Planning Version. It is the identifier of the Planning Version to which the StockTransportPlanningOrder shall be assigned.

StockTransportPlanningOrderItem Package

The StockTransportPlanningOrderItem package groups the Stock Transport Planning Order Item relevant information.

StockTransportPlanningOrderItem

A StockTransportPlanningOrderItem specifies the item which contains the material to be transported. A ProductInternalID is a proprietary identifier for a product. It identifies the product that should be transported.

A LocationInternalID is a proprietary identifier for a location. It identifies the source location of the stock transport. A LocationInternalID is a proprietary identifier for a location. It identifies the target location of the stock transport. The TransportMeansDescriptionCode is a coded representation of the transport means type with which goods or persons are to be transported (e.g., road tanker, barge, airplane, refrigerated road tanker, . . . ). It identifies the means of transport used for the stock transport.

StockTransportPlanningOrderItemScheduleLine Package

The StockTransportPlanningOrderItemScheduleLine package groups the Stock Transport Planning Order Item Schedule Line relevant information.

StockTransportPlanningOrderItemScheduleLine

A StockTransportPlanningOrderItemScheduleLine represents a division of a StockTransportPlanningOrderItem in a stock transport order specifying a schedule line containing the quantity to be delivered and the date and time of the delivery. A Quantity is the non-monetary numerical specification of an amount in a unit of measurement. It gives the product quantity to be transported. GLOBAL_DateTime is the accurate-to-the-second time-point of a calendar day in timezone UTC. It gives the required availability time of the product at the target location. Indicator is the representation of a situation that has exactly two mutually exclusive Boolean values. The FixedIndicator indicates the fixed status of the stock transport planning order item schedule line. A fixed order shall be considered as a constraint by planning applications.

Message Data Type

The message data type StockTransportPlanningOrderCreateConfirmationMessage_sync contains the StockTransportPlanningOrder included in the business document and the business information that is relevant for sending a business document in a message. FIGS. 646-1 through 646-2 show a StockTransportPlanningOrder-CreateConfirmationMessage_sync 646000 package. The StockTransportPlanningOrder-CreateConfirmationMessage_sync 646000 package is a StockTransportPlanningOrder-CreateConfirmationMessage_sync 646004 datatype. The StockTransportPlanningOrder-CreateConfirmationMessage_sync 646000 package includes a StockTransportPlanningOrder-CreateConfirmationMessage_sync 646002 entity. The StockTransportPlanningOrderCreateConfirmationMessage__sync 646000 package includes various packages, namely MessageHeader 646006, StockTransportPlanningOrder 646038 and Log 646050.

The MessageHeader 646006 package is a BasicBusinessDocumentMessageHeader 646012 datatype. The MessageHeader 646006 package includes a MessageHeader 646008 entity.

The MessageHeader 646008 entity has a cardinality of one 646010 meaning that for each instance of the StockTransportPlanningOrderCreateConfirmationMessage_sync 646002 entity there is one MessageHeader 646008 entity. The MessageHeader 646008 entity includes various attributes, namely ID 646014, UUID 646020, ReferenceID 646026 and ReferenceUUID 646032.

The ID 646014 attribute is a BusinessDocumentMessageID 646018 datatype. The ID 646014 attribute has a cardinality of zero or one 646016 meaning that for each instance of the MessageHeader 646008 entity there may be one ID 646014 attribute.

The UUID 646020 attribute is an ATTRIBUTEINDEPENDENT_UUID 646024 datatype. The UUID 646020 attribute has a cardinality of zero or one 646022 meaning that for each instance of the MessageHeader 646008 entity there may be one UUID 646020 attribute.

The ReferenceID 646026 attribute is a BusinessDocumentMessageID 646030 datatype. The ReferenceID 646026 attribute has a cardinality of zero or one 646028 meaning that for each instance of the MessageHeader 646008 entity there may be one ReferenceID 646026 attribute.

The ReferenceUUID 646032 attribute is an ATTRIBUTEINDEPENDENT_UUID 646036 datatype. The ReferenceUUID 646032 attribute has a cardinality of zero or one 646034 meaning that for each instance of the MessageHeader 646008 entity there may be one ReferenceUUID 646032 attribute.

The StockTransportPlanningOrder 646038 package includes a StockTransportPlanningOrder 646040 entity.

The StockTransportPlanningOrder 646040 entity has a cardinality of zero or one 646042 meaning that for each instance of the StockTransportPlanningOrder-CreateConfirmationMessage_sync 646002 entity there may be one StockTransportPlanningOrder 646040 entity. The StockTransportPlanningOrder 646040 entity includes an ID 646044 attribute.

The ID 646044 attribute is a StockTransportPlanningOrderID 646048 datatype. The ID 646044 attribute has a cardinality of one 646046 meaning that for each instance of the StockTransportPlanningOrder 646040 entity there is one ID 646044 attribute.

The Log 646050 package is a Log 646056 datatype. The Log 646050 package includes a Log 646052 entity.

The Log 646052 entity has a cardinality of one 646054 meaning that for each instance of the StockTransportPlanningOrderCreateConfirmationMessage_sync 646002 entity there is one Log 646052 entity. The Log 646052 entity includes various attributes, namely BusinessDocumentProcessingResultCode 646058, MaximumLogItemSeverityCode 646064 and Item 646070.

The BusinessDocumentProcessingResultCode 646058 attribute is a ProcessingResultCode 646062 datatype. The BusinessDocumentProcessingResultCode 646058 attribute has a cardinality of zero or one 646060 meaning that for each instance of the Log 646052 entity there may be one BusinessDocumentProcessingResultCode 646058 attribute.

The MaximumLogItemSeverityCode 646064 attribute is a LogItemSeverityCode 646068 datatype. The MaximumLogItemSeverityCode 646064 attribute has a cardinality of zero or one 646066 meaning that for each instance of the Log 646052 entity there may be one MaximumLogItemSeverityCode 646064 attribute.

The Item 646070 attribute is a LogItem 646074 datatype. The Item 646070 attribute has a cardinality of zero or n 646072 meaning that for each instance of the Log 646052 entity there may be one or more Item 646070 attributes.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It identifies the created StockTransportPlanningOrder.

Log Package

A log is a sequence of messages that result when an application executes a task.

Message Data Type

The message data type StockTransportPlanningOrder-ChangeRequestMessage_sync contains the StockTransportPlanningOrder included in the business document and the business information that is relevant for sending a business document in a message. FIGS. 645-1 through 645-5 show a StockTransportPlanningOrder-ChangeRequestMessage_sync 645000 package. The StockTransportPlanningOrderChangeRequestMessage_sync 645000 package is a StockTransportPlanningOrder-ChangeRequestMessage_sync 645004 datatype. The StockTransportPlanningOrderChangeRequestMessage_sync 645000 package includes a StockTransportPlanningOrder-ChangeRequestMessage_sync 645002 entity. The StockTransportPlanningOrderChangeRequestMessage_sync 645000 package includes various packages, namely MessageHeader 645006 and StockTransportPlanningOrder 6450116.

The MessageHeader 645006 package is a BusinessDocumentMessageHeader 645012 datatype. The MessageHeader 645006 package includes a MessageHeader 645008 entity.

The MessageHeader 645008 entity has a cardinality of one 645010 meaning that for each instance of the StockTransportPlanningOrderChangeRequestMessage_sync 645002 entity there is one MessageHeader 645008 entity. The MessageHeader 645008 entity includes various attributes, namely ID 645014, ReferenceID 645020, CreationDateTime 645026, TestDataIndicator 645032, ReconciliationIndicator 645038 and SenderParty 645044.

The ID 645014 attribute is a BusinessDocumentMessageID 645018 datatype. The ID 645014 attribute has a cardinality of one 645016 meaning that for each instance of the MessageHeader 645008 entity there is one ID 645014 attribute.

The ReferenceID 645020 attribute is a BusinessDocumentMessageID 645024 datatype. The ReferenceID 645020 attribute has a cardinality of zero or one 645022 meaning that for each instance of the MessageHeader 645008 entity there may be one ReferenceID 645020 attribute.

The CreationDateTime 645026 attribute is a GLOBAL_DateTime 645030 datatype. The CreationDateTime 645026 attribute has a cardinality of one 645028 meaning that for each instance of the MessageHeader 645008 entity there is one CreationDateTime 645026 attribute.

The TestDataIndicator 645032 attribute is an Indicator 645036 datatype. The TestDataIndicator 645032 attribute has a cardinality of zero or one 645034 meaning that for each instance of the MessageHeader 645008 entity there may be one TestDataIndicator 645032 attribute.

The ReconciliationIndicator 645038 attribute is an Indicator 645042 datatype. The ReconciliationIndicator 645038 attribute has a cardinality of zero or one 645040 meaning that for each instance of the MessageHeader 645008 entity there may be one ReconciliationIndicator 645038 attribute.

The SenderParty 645044 attribute is a BusinessDocumentMessageHeaderParty 645048 datatype. The SenderParty 645044 attribute has a cardinality of zero or one 645046 meaning that for each instance of the MessageHeader 645008 entity there may be one SenderParty 645044 attribute.

The StockTransportPlanningOrder 6450116 package includes a StockTransportPlanningOrder 6450118 entity. The StockTransportPlanningOrder 6450116 package includes a StockTransportPlanningOrderItem 6450128 package.

The StockTransportPlanningOrder 6450118 entity has a cardinality of one 6450120 meaning that for each instance of the StockTransportPlanningOrderChangeRequestMessage_sync 645002 entity there is one StockTransportPlanningOrder 6450118 entity. The StockTransportPlanningOrder 6450118 entity includes an ID 6450122 attribute.

The ID 6450122 attribute is a StockTransportPlanningOrderID 6450126 datatype. The ID 6450122 attribute has a cardinality of one 6450124 meaning that for each instance of the StockTransportPlanningOrder 6450118 entity there is one ID 6450122 attribute.

The StockTransportPlanningOrderItem 6450128 package includes a StockTrans-portPlanningOrderItem 6450130 entity. The StockTransportPlanningOrderItem 6450128 package includes a StockTransportPlanningOrderItemScheduleLine 6450134 package.

The StockTransportPlanningOrderItem 6450130 entity has a cardinality of one 6450132 meaning that for each instance of the StockTransportPlanningOrder 6450118 entity there is one StockTransportPlanningOrderItem 6450130 entity.

The StockTransportPlanningOrderItemScheduleLine 6450134 package includes a StockTransportPlanningOrderItemScheduleLine 6450136 entity.

The StockTransportPlanningOrderItemScheduleLine 6450136 entity has a cardinality of one 6450138 meaning that for each instance of the StockTransportPlanningOrderItem 6450130 entity there is one StockTransportPlanningOrderItemScheduleLine 6450136 entity. The StockTransportPlanningOrderItemScheduleLine 6450136 entity includes various attributes, namely Quantity 6450140, AvailabilityDateTime 6450146 and FixedIndicator 6450152.

The Quantity 6450140 attribute is a Quantity 6450144 datatype. The Quantity 6450140 attribute has a cardinality of zero or one 6450142 meaning that for each instance of the StockTransportPlanningOrderItemScheduleLine 6450136 entity there may be one Quantity 6450140 attribute.

The AvailabilityDateTime 6450146 attribute is a GLOBAL_DateTime 6450150 datatype. The AvailabilityDateTime 6450146 attribute has a cardinality of zero or one 6450148 meaning that for each instance of the StockTransportPlanningOrderItemScheduleLine 6450136 entity there may be one AvailabilityDateTime 6450146 attribute.

The FixedIndicator 6450152 attribute is an Indicator 6450156 datatype. The FixedIndicator 6450152 attribute has a cardinality of zero or one 6450154 meaning that for each instance of the StockTransportPlanningOrderItemScheduleLine 6450136 entity there may be one FixedIndicator 6450152 attribute.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It identifies the StockTransportPlanningOrder that shall be changed.

StockTransportPlanningOrderItem Package

The StockTransportPlanningOrderItem package groups the Stock Transport Planning Order Item relevant information.

StockTransportPlanningOrderItem

A StockTransportPlanningOrderItem specifies the item which contains the material to be transported.

StockTransportPlanningOrderItemScheduleLine Package

The StockTransportPlanningOrderItemScheduleLine package groups the Stock Transport Planning Order Item Schedule Line relevant information.

StockTransportPlanningOrderItemScheduleLine

A StockTransportPlanningOrderItemScheduleLine represents a division of a StockTransportPlanningOrderItem in a stock transport order specifying a schedule line containing the quantity to be delivered and the date and time of the delivery. A Quantity is the non-monetary numerical specification of an amount in a unit of measurement. It gives the product quantity to be transported. GLOBAL_DateTime is the accurate-to-the-second time-point of a calendar day in timezone UTC.

It gives the required availability time of the product at the target location. Indicator is the representation of a situation that has exactly two mutually exclusive Boolean values. The FixedIndicator indicates the confirmed status of the stock transport order. A fixed order shall be considered as a constraint by planning applications. The following attributes of a StockTransportPlanningOrderItemScheduleLine can be changed Quantity, AvailabilityDateTime, and FixedIndicator.

Message Data Type

The message data type StockTransportPlanningOrderChangeConfirmationMessage_sync contains the StockTransportPlanningOrder included in the business document and the business information that is relevant for sending a business document in a message. FIGS. 644-1 through 644-3 show a StockTransportPlanningOrderChangeConfirmationMessage_sync 644000 package. The StockTransportPlanningOrderChangeConfirmationMessage_sync 644000 package is a StockTransportPlanningOrderChangeConfirmationMessage_sync 644004 datatype. The StockTransportPlanningOrderChangeConfirmationMessage_sync 644000 package includes a StockTransportPlanningOrderChangeConfirmationMessage_sync 644002 entity. The StockTransportPlanningOrderChangeConfirmationMessage__sync 644000 package includes various packages, namely MessageHeader 644006, StockTransportPlanningOrder 644038 and Log 644050.

The MessageHeader 644006 package is a BasicBusinessDocumentMessageHeader 644012 datatype. The MessageHeader 644006 package includes a MessageHeader 644008 entity.

The MessageHeader 644008 entity has a cardinality of one 644010 meaning that for each instance of the StockTransportPlanningOrderChangeConfirmationMessage_sync 644002 entity there is one MessageHeader 644008 entity. The MessageHeader 644008 entity includes various attributes, namely ID 644014, UUID 644020, ReferenceID 644026 and ReferenceUUID 644032.

The ID 644014 attribute is a BusinessDocumentMessageID 644018 datatype. The ID 644014 attribute has a cardinality of zero or one 644016 meaning that for each instance of the MessageHeader 644008 entity there may be one ID 644014 attribute.

The UUID 644020 attribute is an ATTRIBUTEINDEPENDENT_UUID 644024 datatype. The UUID 644020 attribute has a cardinality of zero or one 644022 meaning that for each instance of the MessageHeader 644008 entity there may be one UUID 644020 attribute.

The ReferenceID 644026 attribute is a BusinessDocumentMessageID 644030 datatype. The ReferenceID 644026 attribute has a cardinality of zero or one 644028 meaning that for each instance of the MessageHeader 644008 entity there may be one ReferenceID 644026 attribute.

The ReferenceUUID 644032 attribute is an ATTRIBUTEINDEPENDENT_UUID 644036 datatype. The ReferenceUUID 644032 attribute has a cardinality of zero or one 644034 meaning that for each instance of the MessageHeader 644008 entity there may be one ReferenceUUID 644032 attribute.

The StockTransportPlanningOrder 644038 package includes a StockTransportPlanningOrder 644040 entity.

The StockTransportPlanningOrder 644040 entity has a cardinality of zero or one 644042 meaning that for each instance of the StockTransportPlanningOrderChangeConfirmationMessage_sync 644002 entity there may be one StockTransportPlanningOrder 644040 entity. The StockTransportPlanningOrder 644040 entity includes an ID 644044 attribute.

The ID 644044 attribute is a StockTransportPlanningOrderID 644048 datatype. The ID 644044 attribute has a cardinality of one 644046 meaning that for each instance of the StockTransportPlanningOrder 644040 entity there is one ID 644044 attribute.

The Log 644050 package is a Log 644056 datatype. The Log 644050 package includes a Log 644052 entity.

The Log 644052 entity has a cardinality of one 644054 meaning that for each instance of the StockTransportPlanningOrderChangeConfirmationMessage_sync 644002 entity there is one Log 644052 entity. The Log 644052 entity includes various attributes, namely BusinessDocumentProcessingResultCode 644058, MaximumLogItemSeverityCode 644064 and Item 644070.

The BusinessDocumentProcessingResultCode 644058 attribute is a ProcessingResultCode 644062 datatype. The BusinessDocumentProcessingResultCode 644058 attribute has a cardinality of zero or one 644060 meaning that for each instance of the Log 644052 entity there may be one BusinessDocumentProcessingResultCode 644058 attribute.

The MaximumLogItemSeverityCode 644064 attribute is a LogItemSeverityCode 644068 datatype. The MaximumLogItemSeverityCode 644064 attribute has a cardinality of zero or one 644066 meaning that for each instance of the Log 644052 entity there may be one MaximumLogItemSeverityCode 644064 attribute.

The Item 644070 attribute is a LogItem 644074 datatype. The Item 644070 attribute has a cardinality of zero or n 644072 meaning that for each instance of the Log 644052 entity there may be one or more Item 644070 attributes.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It identifies the created StockTransportPlanningOrder.

Log Package

A log is a sequence of messages that result when an application executes a task.

Message Data Type

The message data type StockTransportPlanningOrderCancelRequestMessage_sync contains the StockTransportPlanningOrder included in the business document and the business information that is relevant for sending a business document in a message. FIGS. 643-1 through 643-4 show a StockTransportPlanningOrderCancelRequestMessage_sync 643000 package. The StockTransportPlanningOrder-CancelRequestMessage_sync 643000 package is a Stock-TransportPlanningOrderCancelRequestMessage_sync 643004 datatype. The StockTransportPlanningOrder-CancelRequestMessage_sync 643000 package includes a StockTransportPlanningOrderCancelRequestMessage_sync 643002 entity. The StockTransportPlanningOrder-CancelRequestMessage_sync 643000 package includes various packages, namely MessageHeader 643006 and Stock-TransportPlanningOrder 6430116.

The MessageHeader 643006 package is a BusinessDocumentMessageHeader 643012 datatype. The MessageHeader 643006 package includes a MessageHeader 643008 entity.

The MessageHeader 643008 entity has a cardinality of one 643010 meaning that for each instance of the StockTransportPlanningOrderCancelRequestMessage_sync 643002 entity there is one MessageHeader 643008 entity. The MessageHeader 643008 entity includes various attributes, namely ID 643014, ReferenceID 643020, CreationDateTime 643026, TestDataIndicator 643032, ReconciliationIndicator 643038 and SenderParty 643044.

The ID 643014 attribute is a BusinessDocumentMessageID 643018 datatype. The ID 643014 attribute has a cardinality of one 643016 meaning that for each instance of the MessageHeader 643008 entity there is one ID 643014 attribute.

The ReferenceID 643020 attribute is a BusinessDocumentMessageID 643024 datatype. The ReferenceID 643020 attribute has a cardinality of zero or one 643022 meaning that for each instance of the MessageHeader 643008 entity there may be one ReferenceID 643020 attribute.

The CreationDateTime 643026 attribute is a GLOBAL_DateTime 643030 datatype. The CreationDateTime 643026 attribute has a cardinality of one 643028 meaning that for each instance of the MessageHeader 643008 entity there is one CreationDateTime 643026 attribute.

The TestDataIndicator 643032 attribute is an Indicator 643036 datatype. The TestDataIndicator 643032 attribute has a cardinality of zero or one 643034 meaning that for each instance of the MessageHeader 643008 entity there may be one TestDataIndicator 643032 attribute.

The ReconciliationIndicator 643038 attribute is an Indicator 643042 datatype. The ReconciliationIndicator 643038 attribute has a cardinality of zero or one 643040 meaning that for each instance of the MessageHeader 643008 entity there may be one ReconciliationIndicator 643038 attribute.

The SenderParty 643044 attribute is a BusinessDocumentMessageHeaderParty 643048 datatype. The SenderParty 643044 attribute has a cardinality of zero or one 643046 meaning that for each instance of the MessageHeader 643008 entity there may be one SenderParty 643044 attribute.

The StockTransportPlanningOrder 6430116 package includes a StockTransportPlanningOrder 6430118 entity.

The StockTransportPlanningOrder 6430118 entity has a cardinality of one 6430120 meaning that for each instance of the StockTransportPlanningOrder-CancelRequestMessage_sync 643002 entity there is one StockTransportPlanningOrder 6430118 entity. The Stock-TransportPlanningOrder 6430118 entity includes an ID 6430122 attribute.

The ID 6430122 attribute is a StockTransportPlanningOrderID 6430126 datatype. The ID 6430122 attribute has a cardinality of one 6430124 meaning that for each instance of the StockTransportPlanningOrder 6430118 entity there is one ID 6430122 attribute.

MessageHeader Package

A MessageHeader package groups the business information that is relevant for sending a business document in a message.

6.1.1 MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A Stock-TransportPlanningOrderID is a unique identifier for a Stock Transport Planning Order. It identifies the StockTransportPlanningOrder that shall be cancelled.

Message Data Type

The message data type StockTransportPlanningOrder-CancelConfirmationMessage_sync contains the StockTransportPlanningOrder included in the business document and the business information that is relevant for sending a business document in a message. FIGS. 642-1 through 642-3 show a StockTransportPlanningOrder-CancelConfirmationMessage_sync 642000 package. The StockTransportPlanningOrder-CancelConfirmationMessage_sync 642000 package is a StockTransportPlanningOrder-CancelConfirmationMessage_sync 642004 datatype. The StockTransportPlanningOrder-CancelConfirmationMessage_sync 642000 package includes a StockTransportPlanningOrder-CancelConfirmationMessage_sync 642002 entity. The StockTransportPlanningOrder-CancelConfirmationMessage_sync 642000 package includes various packages, namely MessageHeader 642006, Stock-TransportPlanningOrder 642038 and Log 642050.

The MessageHeader 642006 package is a BasicBusinessDocumentMessageHeader 642012 datatype. The MessageHeader 642006 package includes a MessageHeader 642008 entity.

The MessageHeader 642008 entity has a cardinality of one 642010 meaning that for each instance of the StockTransportPlanningOrderCancelConfirmationMessage_sync 642002 entity there is one MessageHeader 642008 entity. The MessageHeader 642008 entity includes various attributes, namely ID 642014, UUID 642020, ReferenceID 642026 and ReferenceUUID 642032.

The ID 642014 attribute is a BusinessDocumentMessageID 642018 datatype. The ID 642014 attribute has a cardinality of zero or one 642016 meaning that for each instance of the MessageHeader 642008 entity there may be one ID 642014 attribute.

The UUID 642020 attribute is an ATTRIBUTEINDEPENDENT_UUID 642024 datatype. The UUID 642020 attribute has a cardinality of zero or one 642022 meaning that for each instance of the MessageHeader 642008 entity there may be one UUID 642020 attribute.

The ReferenceID 642026 attribute is a BusinessDocumentMessageID 642030 datatype. The ReferenceID 642026 attribute has a cardinality of zero or one 642028 meaning that for each instance of the MessageHeader 642008 entity there may be one ReferenceID 642026 attribute.

The ReferenceUUID 642032 attribute is an ATTRIBUTEINDEPENDENT_UUID 642036 datatype. The ReferenceUUID 642032 attribute has a cardinality of zero or one 642034 meaning that for each instance of the MessageHeader 642008 entity there may be one ReferenceUUID 642032 attribute.

The StockTransportPlanningOrder 642038 package includes a StockTransportPlanningOrder 642040 entity.

The StockTransportPlanningOrder 642040 entity has a cardinality of zero or one 642042 meaning that for each instance of the StockTransportPlanningOrderCancelConfirmationMessage_sync 642002 entity there may be one StockTransportPlanningOrder 642040 entity. The StockTransportPlanningOrder 642040 entity includes an ID 642044 attribute.

The ID 642044 attribute is a StockTransportPlanningOrderID 642048 datatype. The ID 642044 attribute has a cardinality of one 642046 meaning that for each instance of the StockTransportPlanningOrder 642040 entity there is one ID 642044 attribute.

The Log 642050 package is a Log 642056 datatype. The Log 642050 package includes a Log 642052 entity.

The Log 642052 entity has a cardinality of one 642054 meaning that for each instance of the StockTransportPlanningOrderCancelConfirmationMessage_sync 642002 entity there is one Log 642052 entity. The Log 642052 entity includes various attributes, namely BusinessDocumentProcessingResultCode 642058, MaximumLogItemSeverityCode 642064 and Item 642070.

The BusinessDocumentProcessingResultCode 642058 attribute is a ProcessingResultCode 642062 datatype. The BusinessDocumentProcessingResultCode 642058 attribute has a cardinality of zero or one 642060 meaning that for each instance of the Log 642052 entity there may be one BusinessDocumentProcessingResultCode 642058 attribute.

The MaximumLogItemSeverityCode 642064 attribute is a LogItemSeverityCode 642068 datatype. The MaximumLogItemSeverityCode 642064 attribute has a cardinality of zero or one 642066 meaning that for each instance of the Log 642052 entity there may be one MaximumLogItemSeverityCode 642064 attribute.

The Item 642070 attribute is a LogItem 642074 datatype. The Item 642070 attribute has a cardinality of zero or n 642072 meaning that for each instance of the Log 642052 entity there may be one or more Item 642070 attributes.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It identifies the created StockTransportPlanningOrder.

Log Package

A log is a sequence of messages that result when an application executes a task.

Message Data Type

The message data type StockTransportPlanningOrderByIDQueryMessage_sync contains the StockTransportPlanningOrder included in the business document and the business information that is relevant for sending a business document in a message. FIGS. 640-1 through 640-5 show a StockTransportPlanningOrderByIDQueryMessage_sync 640000 package. The StockTransportPlanningOrderByIDQueryMessage_sync 640000 package is a StockTransportPlanningOrderByIDQueryMessage_sync 640004 datatype. The StockTransportPlanningOrderByIDQueryMessage_sync 640000 package includes a StockTransportPlanningOrderByIDQueryMessage_sync 640002 entity. The StockTransportPlanningOrderByIDQueryMessage__sync 640000 package includes various packages, namely MessageHeader 640006 and Selection 6400116.

The MessageHeader 640006 package is a BusinessDocumentMessageHeader 640012 datatype. The MessageHeader 640006 package includes a MessageHeader 640008 entity.

The MessageHeader 640008 entity has a cardinality of one 640010 meaning that for each instance of the StockTransportPlanningOrderByIDQueryMessage_sync 640002 entity there is one MessageHeader 640008 entity. The MessageHeader 640008 entity includes various attributes, namely ID 640014, ReferenceID 640020, CreationDateTime 640026, TestDataIndicator 640032, ReconciliationIndicator 640038 and SenderParty 640044.

The ID 640014 attribute is a BusinessDocumentMessageID 640018 datatype. The ID 640014 attribute has a cardinality of one 640016 meaning that for each instance of the MessageHeader 640008 entity there is one ID 640014 attribute.

The ReferenceID 640020 attribute is a BusinessDocumentMessageID 640024 datatype. The ReferenceID 640020 attribute has a cardinality of zero or one 640022 meaning that for each instance of the MessageHeader 640008 entity there may be one ReferenceID 640020 attribute.

The CreationDateTime 640026 attribute is a GLOBAL_DateTime 640030 datatype. The CreationDateTime 640026 attribute has a cardinality of one 640028 meaning that for each instance of the MessageHeader 640008 entity there is one CreationDateTime 640026 attribute.

The TestDataIndicator 640032 attribute is an Indicator 640036 datatype. The TestDataIndicator 640032 attribute has a cardinality of zero or one 640034 meaning that for each instance of the MessageHeader 640008 entity there may be one TestDataIndicator 640032 attribute.

The ReconciliationIndicator 640038 attribute is an Indicator 640042 datatype. The ReconciliationIndicator 640038 attribute has a cardinality of zero or one 640040 meaning that for each instance of the MessageHeader 640008 entity there may be one ReconciliationIndicator 640038 attribute.

The SenderParty 640044 attribute is a BusinessDocumentMessageHeaderParty 640048 datatype. The SenderParty 640044 attribute has a cardinality of zero or one 640046 meaning that for each instance of the MessageHeader 640008 entity there may be one SenderParty 640044 attribute.

The Selection 6400116 package includes a StockTransportPlanningOrderSelectionByID 6400118 entity.

The StockTransportPlanningOrderSelectionByID 6400118 entity has a cardinality of one 6400120 meaning that for each instance of the StockTransportPlanningOrderByIDQueryMessage_sync 640002 entity there is one StockTransportPlanningOrderSelectionByID 6400118 entity. The StockTransportPlanningOrderSelectionByID 6400118 entity includes a StockTransportPlanningOrderID 6400122 attribute.

The StockTransportPlanningOrderID 6400122 attribute is a StockTransportPlanningOrderID 6400126 datatype. The StockTransportPlanningOrderID 6400122 attribute has a cardinality of one 6400124 meaning that for each instance of the StockTransportPlanningOrderSelectionByID 6400118 entity there is one StockTransportPlanningOrderID 6400122 attribute.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

Selection Package

This package enables to query a stock transport planning order in the Supply And Demand Matching.

StockTransportPlanningOrderSelectionByID

The StockTransportPlanningOrderSelectionByID contains the ID of the stock trans-port planning order, in this way one stock transport planning order can be queried. A StockTransportPlanningOrderID is a unique identifier for a Stock Transport Planning Order. It identifies the StockTransportPlanningOrder that is queried.

Message Data Type

The message data type StockTransportPlanningOrderByIDResponseMessage_sync contains the StockTransportPlanningOrder included in the business document and the business information that is relevant for sending a business document in a message. FIGS. 641-1 through 641-7 show a StockTransportPlanningOrderByIDResponseMessage_sync 641000 package. The StockTransportPlanningOrderByIDResponseMessage_sync 641000 package is a StockTransportPlanningOrderByIDResponseMessage_sync 641004 datatype. The StockTransportPlanningOrderByIDResponseMessage_sync 641000 package includes a StockTransportPlanningOrderByIDResponseMessage_sync 641002 entity. The StockTransportPlanningOrderByIDResponseMessage_sync 641000 package includes various packages, namely MessageHeader 641006, StockTransportPlanningOrder 641038 and Log 6410182.

The MessageHeader 641006 package is a BasicBusinessDocumentMessageHeader 641012 datatype. The MessageHeader 641006 package includes a MessageHeader 641008 entity.

The MessageHeader 641008 entity has a cardinality of one 641010 meaning that for each instance of the StockTransportPlanningOrderByIDResponseMessage_sync 641002 entity there is one MessageHeader 641008 entity. The MessageHeader 641008 entity includes various attributes, namely ID 641014, UUID 641020, ReferenceID 641026 and ReferenceUUID 641032.

The ID 641014 attribute is a BusinessDocumentMessageID 641018 datatype. The ID 641014 attribute has a cardinality of zero or one 641016 meaning that for each instance of the MessageHeader 641008 entity there may be one ID 641014 attribute.

The UUID 641020 attribute is an ATTRIBUTEINDEPENDENT_UUID 641024 datatype. The UUID 641020 attribute has a cardinality of zero or one 641022 meaning that for each instance of the MessageHeader 641008 entity there may be one UUID 641020 attribute.

The ReferenceID 641026 attribute is a BusinessDocumentMessageID 641030 datatype. The ReferenceID 641026 attribute has a cardinality of zero or one 641028 meaning that for each instance of the MessageHeader 641008 entity there may be one ReferenceID 641026 attribute.

The ReferenceUUID 641032 attribute is an ATTRIBUTEINDEPENDENT_UUID 641036 datatype. The ReferenceUUID 641032 attribute has a cardinality of zero or one 641034 meaning that for each instance of the MessageHeader 641008 entity there may be one ReferenceUUID 641032 attribute.

The StockTransportPlanningOrder 641038 package includes a StockTransportPlanningOrder 641040 entity. The StockTransportPlanningOrder 641038 package includes a StockTransportPlanningOrderItem 641056 package.

The StockTransportPlanningOrder 641040 entity has a cardinality of zero or one 641042 meaning that for each instance of the StockTransportPlanningOrderByIDResponseMessage_sync 641002 entity there may be one StockTransportPlanningOrder 641040 entity. The StockTransportPlanningOrder 641040 entity includes various attributes, namely ID 641044 and PlanningVersionID 641050.

The ID 641044 attribute is a StockTransportPlanningOrderID 641048 datatype. The ID 641044 attribute has a cardinality of one 641046 meaning that for each instance of the StockTransportPlanningOrder 641040 entity there is one ID 641044 attribute.

The PlanningVersionID 641050 attribute is a PlanningVersionID 641054 datatype. The PlanningVersionID 641050 attribute has a cardinality of one 641052 meaning that for each instance of the StockTransportPlanningOrder 641040 entity there is one PlanningVersionID 641050 attribute.

The StockTransportPlanningOrderItem 641056 package includes a StockTransportPlanningOrderItem 641058 entity. The StockTransportPlanningOrderItem 641056 package includes a StockTransportPlanningOrderItemScheduleLine 641086 package.

The StockTransportPlanningOrderItem 641058 entity has a cardinality of one 641060 meaning that for each instance of the StockTransportPlanningOrder 641040 entity there is one StockTransportPlanningOrderItem 641058 entity. The StockTransportPlanningOrderItem 641058 entity includes various attributes, namely ProductInternalID 641062, TargetLocationInternalID 641068, SourceLocationInternalID 641074 and TransportMeansDescriptionCode 641080.

The ProductInternalID 641062 attribute is a ProductInternalID 641066 datatype. The ProductInternalID 641062 attribute has a cardinality of one 641064 meaning that for each instance of the StockTransportPlanningOrderItem 641058 entity there is one ProductInternalID 641062 attribute.

The TargetLocationInternalID 641068 attribute is a LocationInternalID 641072 datatype. The TargetLocationInternalID 641068 attribute has a cardinality of one 641070 meaning that for each instance of the StockTransportPlanningOrderItem 641058 entity there is one TargetLocationInternalID 641068 attribute.

The SourceLocationInternalID 641074 attribute is a LocationInternalID 641078 datatype. The SourceLocationInternalID 641074 attribute has a cardinality of one 641076 meaning that for each instance of the StockTransportPlanningOrderItem 641058 entity there is one SourceLocationInternalID 641074 attribute.

The TransportMeansDescriptionCode 641080 attribute is a TransportMeansDescriptionCode 641084 datatype. The TransportMeansDescriptionCode 641080 attribute has a cardinality of one 641082 meaning that for each instance of the StockTransportPlanningOrderItem 641058 entity there is one TransportMeansDescriptionCode 641080 attribute.

The StockTransportPlanningOrderItemScheduleLine 641086 package includes a StockTransportPlanningOrderItemScheduleLine 641088 entity.

The StockTransportPlanningOrderItemScheduleLine 641088 entity has a cardinality of one 641090 meaning that for each instance of the StockTransportPlanningOrderItem 641058 entity there is one StockTransportPlanningOrderItemScheduleLine 641088 entity. The StockTransportPlanningOrderItemScheduleLine 641088 entity includes various attributes, namely Quantity 641092, AvailabilityDateTime 641098, FixedIndicator 6410104, GoodsReceiptDuration 6410110, GoodsReceiptCapacity 6410116, GoodsReceiptResourceID 6410122, DeliveryDateTime 6410128, TransportDuration 6410134, TransportCapacity 6410140, TransportResourceID 6410146, ShipmentDateTime 6410152, GoodsIssueDuration 6410158, GoodsIssueCapacity 6410164, GoodsIssueResourceID 6410170 and RequirementDateTime 6410176.

The Quantity 641092 attribute is a Quantity 641096 datatype. The Quantity 641092 attribute has a cardinality of one 641094 meaning that for each instance of the StockTransportPlanningOrderItemScheduleLine 641088 entity there is one Quantity 641092 attribute.

The AvailabilityDateTime 641098 attribute is a GLOBAL_DateTime 6410102 datatype. The AvailabilityDateTime 641098 attribute has a cardinality of one 6410100 meaning that for each instance of the StockTransportPlanningOrderItemScheduleLine 641088 entity there is one AvailabilityDateTime 641098 attribute.

The FixedIndicator 6410104 attribute is an Indicator 6410108 datatype. The FixedIndicator 6410104 attribute has a cardinality of one 6410106 meaning that for each instance of the StockTransportPlanningOrderItemScheduleLine 641088 entity there is one FixedIndicator 6410104 attribute.

The GoodsReceiptDuration 6410110 attribute is a Duration 6410114 datatype. The GoodsReceiptDuration 6410110 attribute has a cardinality of one 6410112 meaning that for each instance of the StockTransportPlanningOrderItemScheduleLine 641088 entity there is one GoodsReceiptDuration 6410110 attribute.

The GoodsReceiptCapacity 6410116 attribute is a Quantity 6410120 datatype. The GoodsReceiptCapacity 6410116 attribute has a cardinality of zero or one 6410118 meaning that for each instance of the StockTransportPlanningOrderItemScheduleLine 641088 entity there may be one GoodsReceiptCapacity 6410116 attribute.

The GoodsReceiptResourceID 6410122 attribute is a ResourceID 6410126 datatype. The GoodsReceiptResourceID 6410122 attribute has a cardinality of zero or one 6410124 meaning that for each instance of the StockTransportPlanningOrderItemScheduleLine 641088 entity there may be one GoodsReceiptResourceID 6410122 attribute.

The DeliveryDateTime 6410128 attribute is a GLOBAL_DateTime 6410132 datatype. The DeliveryDateTime 6410128 attribute has a cardinality of one 6410130 meaning that for each instance of the StockTransportPlanningOrderItemScheduleLine 641088 entity there is one DeliveryDateTime 6410128 attribute.

The TransportDuration 6410134 attribute is a Duration 6410138 datatype. The TransportDuration 6410134 attribute has a cardinality of one 6410136 meaning that for each instance of the StockTransportPlanningOrderItemScheduleLine 641088 entity there is one TransportDuration 6410134 attribute.

The TransportCapacity 6410140 attribute is a Quantity 6410144 datatype. The TransportCapacity 6410140 attribute has a cardinality of zero or one 6410142 meaning that for each instance of the StockTransportPlanningOrderItemScheduleLine 641088 entity there may be one TransportCapacity 6410140 attribute.

The TransportResourceID 6410146 attribute is a ResourceID 6410150 datatype. The TransportResourceID 6410146 attribute has a cardinality of zero or one 6410148 meaning that for each instance of the StockTransportPlanningOrderItemScheduleLine 641088 entity there may be one TransportResourceID 6410146 attribute.

The ShipmentDateTime 6410152 attribute is a GLOBAL_DateTime 6410156 datatype. The ShipmentDateTime 6410152 attribute has a cardinality of one 6410154 meaning that for each instance of the StockTransportPlanningOrderItemScheduleLine 641088 entity there is one ShipmentDateTime 6410152 attribute.

The GoodsIssueDuration 6410158 attribute is a Duration 6410162 datatype. The GoodsIssueDuration 6410158 attribute has a cardinality of one 6410160 meaning that for each instance of the StockTransportPlanningOrderItemScheduleLine 641088 entity there is one GoodsIssueDuration 6410158 attribute.

The GoodsIssueCapacity 6410164 attribute is a Quantity 6410168 datatype. The GoodsIssueCapacity 6410164 attribute has a cardinality of zero or one 6410166 meaning that for each instance of the StockTransportPlanningOrderItemScheduleLine 641088 entity there may be one GoodsIssueCapacity 6410164 attribute.

The GoodsIssueResourceD 6410170 attribute is a ResourceID 6410174 datatype. The GoodsIssueResourceID 6410170 attribute has a cardinality of zero or one 6410172 meaning that for each instance of the StockTransportPlanningOrderItemScheduleLine 641088 entity there may be one GoodsIssueResourceID 6410170 attribute.

The RequirementDateTime 6410176 attribute is a GLOBAL_DateTime 6410180 datatype. The RequirementDateTime 6410176 attribute has a cardinality of one 6410178 meaning that for each instance of the StockTransportPlanningOrderItemScheduleLine 641088 entity there is one RequirementDateTime 6410176 attribute.

The Log 6410182 package is a Log 6410188 datatype. The Log 6410182 package includes a Log 6410184 entity.

The Log 6410184 entity has a cardinality of one 6410186 meaning that for each instance of the StockTransportPlanningOrderByIDResponseMessage_sync 641002 entity there is one Log 6410184 entity. The Log 6410184 entity includes various attributes, namely BusinessDocumentProcessingResultCode 6410190, MaximumLogItemSeverityCode 6410196 and Item 6410202.

The BusinessDocumentProcessingResultCode 6410190 attribute is a ProcessingResultCode 6410194 datatype. The BusinessDocumentProcessingResultCode 6410190 attribute has a cardinality of zero or one 6410192 meaning that for each instance of the Log 6410184 entity there may be one BusinessDocumentProcessingResultCode 6410190 attribute.

The MaximumLogItemSeverityCode 6410196 attribute is a LogItemSeverityCode 6410200 datatype. The MaximumLogItemSeverityCode 6410196 attribute has a cardinality of zero or one 6410198 meaning that for each instance of the Log 6410184 entity there may be one MaximumLogItemSeverityCode 6410196 attribute.

The Item 6410202 attribute is a LogItem 6410206 datatype. The Item 6410202 attribute has a cardinality of zero or n 6410204 meaning that for each instance of the Log 6410184 entity there may be one or more Item 6410202 attributes.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It is the unique identifier of the queried StockTransportPlanningOrder. PlanningVersionID is a unique identifier for a Planning Version. It is the identifier of the Planning Version to which the queried StockTransportPlanningOrder is assigned.

StockTransportPlanningOrderItem Package

The StockTransportPlanningOrderItem package groups the Stock Transport Planning Order Item relevant information.

StockTransportPlanningOrderItem

A StockTransportPlanningOrderItem specifies the item which contains the material to be transported. A ProductInternalID is a proprietary identifier for a product. It identifies the product that is transported. A LocationInternalID is a proprietary identifier for a location. It identifies the source location of the stock transport. A LocationInternalID is a proprietary identifier for a location. It identifies the target location of the stock transport. The TransportMeansDescriptionCode is a coded representation of the transport means type with which goods or persons are to be transported (e.g., road tanker, barge, airplane, refrigerated road tanker, . . . ). It identifies the means of transport used for the stock transport.

StockTransportPlanningOrderItemScheduleLine Package

The StockTransportPlanningOrderItemScheduleLine package groups the Stock Transport Planning Order Item Schedule Line relevant information.

StockTransportPlanningOrderItemScheduleLine

A StockTransportPlanningOrderItemScheduleLine represents a division of a StockTransportPlanningOrderItem in a stock transport order specifying a schedule line containing the quantity to be delivered and the date and time of the delivery.

A Quantity is the non-monetary numerical specification of an amount in a unit of measurement. It gives the product quantity to be transported. GLOBAL_DateTime is the accurate-to-the-second time-point of a calendar day in timezone UTC. It gives the required availability time of the product at the target location. Indicator is the representation of a situation that has exactly two mutually exclusive Boolean values. The FixedIndicator indicates the confirmed status of the stock transport order. A fixed order shall be considered as a constraint by planning applications. A Duration is a period of time of a particular length without fixed start or end time. This period of time is expressed in years, months days, hours, minutes, seconds and fractions of a second. It gives the duration of the goods receipt. A ResourceID is a unique identifier for a resource. It identifies the resource used during the goods receipt. A Quantity is the non-monetary numerical specification of an amount in a unit of measurement. It gives the capacity requirement of the resource used during the goods receipt. GLOBAL_DateTime is the accurate-to-the-second time-point of a calendar day in timezone UTC. It gives the delivery time of the product. A Duration is a period of time of a particular length without fixed start or end time. This period of time is expressed in years, months days, hours, minutes, seconds and fractions of a second. It gives the duration of the transportation. A ResourceID is a unique identifier for a resource. It identifies the resource used during the transportation. A Quantity is the non-monetary numerical specification of an amount in a unit of measurement. It gives the capacity requirement of the resource used during the transportation. GLOBAL_DateTime is the accurate-to-the-second time-point of a calendar day in timezone UTC. It gives the shipment time of the product. A Duration is a period of time of a particular length without fixed start or end time. This period of time is expressed in years, months days, hours, minutes, seconds and fractions of a second. It gives the duration of the goods issue. A ResourceID is a unique identifier for a resource. It identifies the resource used during the goods issue. A Quantity is the non-monetary numerical specification of an amount in a unit of measurement. It gives the capacity requirement of the resource used during the goods issue. GLOBAL_DateTime is the accurate-to-the-second time-point of a calendar day in timezone UTC. It gives the time when the product is required for stock transport at the source location.

Log Package

A log is a sequence of messages that result when an application executes a task.

Message Data Type

The message data type StockTransportPlanningOrderByElementsQueryMessage_sync contains the StockTransportPlanningOrder included in the business document and the business information that is relevant for sending a business document in a message. FIGS. 638-1 through 638-9 show a StockTransportPlanningOrderByElementsQueryMessage_sync 638000 package. The StockTransportPlanningOrderByElementsQueryMessage_sync 638000 package is a StockTransportPlanningOrderByElementsQueryMessage_sync 638004 datatype. The StockTransportPlanningOrderByElementsQueryMessage_sync 638000 package includes a StockTransportPlanningOrder- ByElementsQueryMessage_sync 638002 entity. The StockTransportPlanningOrderByElementsQueryMessage_sync 638000 package includes various packages, namely MessageHeader 638006 and Selection 6380116.

The MessageHeader 638006 package is a BusinessDocumentMessageHeader 638012 datatype. The MessageHeader 638006 package includes a MessageHeader 638008 entity.

The MessageHeader 638008 entity has a cardinality of one 638010 meaning that for each instance of the StockTransportPlanningOrderByElementsQueryMessage_sync 638002 entity there is one MessageHeader 638008 entity. The MessageHeader 638008 entity includes various attributes, namely ID 638014, ReferenceID 638020, CreationDateTime 638026, TestDataIndicator 638032, ReconciliationIndicator 638038 and SenderParty 638044.

The ID 638014 attribute is a BusinessDocumentMessageID 638018 datatype. The ID 638014 attribute has a cardinality of one 638016 meaning that for each instance of the MessageHeader 638008 entity there is one ID 638014 attribute.

The ReferenceID 638020 attribute is a BusinessDocumentMessageID 638024 datatype. The ReferenceID 638020 attribute has a cardinality of zero or one 638022 meaning that for each instance of the MessageHeader 638008 entity there may be one ReferenceID 638020 attribute.

The CreationDateTime 638026 attribute is a GLOBAL_DateTime 638030 datatype. The CreationDateTime 638026 attribute has a cardinality of one 638028 meaning that for each instance of the MessageHeader 638008 entity there is one CreationDateTime 638026 attribute.

The TestDataIndicator 638032 attribute is an Indicator 638036 datatype. The TestDataIndicator 638032 attribute has a cardinality of zero or one 638034 meaning that for each instance of the MessageHeader 638008 entity there may be one TestDataIndicator 638032 attribute.

The ReconciliationIndicator 638038 attribute is an Indicator 638042 datatype. The ReconciliationIndicator 638038 attribute has a cardinality of zero or one 638040 meaning that for each instance of the MessageHeader 638008 entity there may be one ReconciliationIndicator 638038 attribute.

The SenderParty 638044 attribute is a BusinessDocumentMessageHeaderParty 638048 datatype. The SenderParty 638044 attribute has a cardinality of zero or one 638046 meaning that for each instance of the MessageHeader 638008 entity there may be one SenderParty 638044 attribute.

The Selection 6380116 package includes a StockTransportPlanningOrderSelectionByElements 6380118 entity.

The StockTransportPlanningOrderSelectionByElements 6380118 entity has a cardinality of one 6380120 meaning that for each instance of the StockTransportPlanningOrderByElementsQueryMessage_sync 638002 entity there is one StockTransportPlanningOrderSelectionByElements 6380118 entity. The StockTransportPlanningOrderSelectionByElements 6380118 entity includes a PlanningVersionID 6380122 attribute. The StockTrans-portPlanningOrderSelectionByElements 6380118 entity has various subordinate entities, namely SelectionByItemProductInternalID 6380128, SelectionByItemTargetLocationInternalID 6380156, SelectionByItemSourceLocationInternalID 6380184, SelectionByItemTransportMeansDescriptionCode 6380212, ItemScheduleLineAvailabilityDateTimePeriod 6380240, ItemScheduleLineRequirementDateTimePeriod 6380258, ItemScheduleLineFixedIndicator 6380276, SelectionOffsetNumber 6380282 and MaximumNumberValue 6380288.

The PlanningVersionID 6380122 attribute is a PlanningVersionID 6380126 datatype. The PlanningVersionID 6380122 attribute has a cardinality of one 6380124 meaning that for each instance of the StockTransportPlanningOrderSelectionByElements 6380118 entity there is one PlanningVersionID 6380122 attribute.

The SelectionByItemProductInternalID 6380128 entity has a cardinality of zero or n 6380130 meaning that for each instance of the StockTransportPlanningOrderSelectionByElements 6380118 entity there may be one or more SelectionByItemProductInternalID 6380128 entities. The SelectionByItemProductInternalID 6380128 entity includes various attributes, namely InclusionExclusionCode 6380132, IntervalBoundaryTypeCode 6380138, LowerBoundaryProductInternalID 6380144 and UpperBoundaryProductInternalID 6380150.

The InclusionExclusionCode 6380132 attribute is an InclusionExclusionCode 6380136 datatype. The InclusionExclusionCode 6380132 attribute has a cardinality of zero or one 6380134 meaning that for each instance of the SelectionByItemProductInternalID 6380128 entity there may be one InclusionExclusionCode 6380132 attribute.

The IntervalBoundaryTypeCode 6380138 attribute is an IntervalBoundaryTypeCode 6380142 datatype. The IntervalBoundaryTypeCode 6380138 attribute has a cardinality of one 6380140 meaning that for each instance of the SelectionByItemProductInternalID 6380128 entity there is one IntervalBoundaryTypeCode 6380138 attribute.

The LowerBoundaryProductInternalID 6380144 attribute is a ProductInternalID 6380148 datatype. The LowerBoundaryProductInternalID 6380144 attribute has a cardinality of zero or one 6380146 meaning that for each instance of the SelectionByItemProductInternalID 6380128 entity there may be one LowerBoundaryProductInternalID 6380144 attribute.

The UpperBoundaryProductInternalID 6380150 attribute is a ProductInternalID 6380154 datatype. The UpperBoundaryProductInternalID 6380150 attribute has a cardinality of zero or one 6380152 meaning that for each instance of the SelectionByItemProductInternalID 6380128 entity there may be one UpperBoundaryProductInternalID 6380150 attribute.

The SelectionByItemTargetLocationInternalID 6380156 entity has a cardinality of zero or n 6380158 meaning that for each instance of the StockTransportPlanningOrderSelectionByElements 6380118 entity there may be one or more SelectionByItemTargetLocationInternalID 6380156 entities. The SelectionByItemTargetLocationInternalID 6380156 entity includes various attributes, namely InclusionExclusionCode 6380160, IntervalBoundaryTypeCode 6380166, LowerBoundaryLocationInternalID 6380172 and UpperBoundaryLocationInternalID 6380178.

The InclusionExclusionCode 6380160 attribute is an InclusionExclusionCode 6380164 datatype. The InclusionExclusionCode 6380160 attribute has a cardinality of zero or one 6380162 meaning that for each instance of the SelectionByItemTargetLocationInternalID 6380156 entity there may be one InclusionExclusionCode 6380160 attribute.

The IntervalBoundaryTypeCode 6380166 attribute is an IntervalBoundaryTypeCode 6380170 datatype. The IntervalBoundaryTypeCode 6380166 attribute has a cardinality of one 6380168 meaning that for each instance of the SelectionByItemTargetLocationInternalID 6380156 entity there is one IntervalBoundaryTypeCode 6380166 attribute.

The LowerBoundaryLocationInternalID 6380172 attribute is a LocationInternalID 6380176 datatype. The LowerBoundaryLocationInternalID 6380172 attribute has a cardinality of zero or one 6380174 meaning that for each instance of the SelectionByItemTargetLocationInternalID 6380156 entity there may be one LowerBoundaryLocation-InternalID 6380172 attribute.

The UpperBoundaryLocationInternalID 6380178 attribute is a LocationInternalID 6380182 datatype. The UpperBoundaryLocationInternalID 6380178 attribute has a cardinality of zero or one 6380180 meaning that for each instance of the SelectionByItemTargetLocationInternalID 6380156 entity there may be one UpperBoundaryLocationInternalID 6380178 attribute.

The SelectionByItemSourceLocationInternalID 6380184 entity has a cardinality of zero or n 6380186 meaning that for each instance of the StockTransportPlanningOrder-SelectionByElements 6380118 entity there may be one or more SelectionByItemSourceLocationInternalID 6380184 entities. The SelectionByItemSourceLocationInternalID 6380184 entity includes various attributes, namely Inclusion-ExclusionCode 6380188, IntervalBoundaryTypeCode 6380194, LowerBoundaryLocationInternalID 6380200 and UpperBoundaryLocationInternalID 6380206.

The InclusionExclusionCode 6380188 attribute is an InclusionExclusionCode 6380192 datatype. The Inclusion-ExclusionCode 6380188 attribute has a cardinality of zero or one 6380190 meaning that for each instance of the Selection-ByItemSourceLocationInternalID 6380184 entity there may be one InclusionExclusionCode 6380188 attribute.

The IntervalBoundaryTypeCode 6380194 attribute is an IntervalBoundaryTypeCode 6380198 datatype. The Interval-BoundaryTypeCode 6380194 attribute has a cardinality of one 6380196 meaning that for each instance of the Selection-ByItemSourceLocationInternalID 6380184 entity there is one IntervalBoundaryTypeCode 6380194 attribute.

The LowerBoundaryLocationInternalID 6380200 attribute is a LocationInternalID 6380204 datatype. The LowerBoundaryLocationInternalID 6380200 attribute has a cardinality of zero or one 6380202 meaning that for each instance of the SelectionByItemSourceLocationInternalID 6380184 entity there may be one LowerBoundaryLocation-InternalID 6380200 attribute.

The UpperBoundaryLocationInternalID 6380206 attribute is a LocationInternalID 6380210 datatype. The UpperBoundaryLocationInternalID 6380206 attribute has a cardinality of zero or one 6380208 meaning that for each instance of the SelectionByItemSourceLocationInternalID 6380184 entity there may be one UpperBoundaryLocationInternalID 6380206 attribute.

The SelectionByItemTransportMeansDescriptionCode 6380212 entity has a cardinality of zero or n 6380214 meaning that for each instance of the StockTransportPlanningOrderSelectionByElements 6380118 entity there may be one or more SelectionByItemTransport-MeansDescriptionCode 6380212 entities. The SelectionBy-ItemTransportMeansDescriptionCode 6380212 entity includes various attributes, namely InclusionExclusionCode 6380216, IntervalBoundaryTypeCode 6380222, Lower-BoundaryTransportMeansDescriptionCode 6380228 and UpperBoundaryTransportMeansDescriptionCode 6380234.

The InclusionExclusionCode 6380216 attribute is an InclusionExclusionCode 6380220 datatype. The Inclusion-ExclusionCode 6380216 attribute has a cardinality of zero or one 6380218 meaning that for each instance of the Selection-ByItemTransportMeansDescriptionCode 6380212 entity there may be one InclusionExclusionCode 6380216 attribute.

The IntervalBoundaryTypeCode 6380222 attribute is an IntervalBoundaryTypeCode 6380226 datatype. The Interval-BoundaryTypeCode 6380222 attribute has a cardinality of one 6380224 meaning that for each instance of the Selection-ByItemTransportMeansDescriptionCode 6380212 entity there is one IntervalBoundaryTypeCode 6380222 attribute.

The LowerBoundaryTransportMeansDescriptionCode 6380228 attribute is a Trans-portMeansDescriptionCode 6380232 datatype. The LowerBoundaryTransportMeans-DescriptionCode 6380228 attribute has a cardinality of zero or one 6380230 meaning that for each instance of the SelectionByItemTransportMeansDescriptionCode 6380212 entity there may be one LowerBoundaryTransportMeans-DescriptionCode 6380228 attribute.

The UpperBoundaryTransportMeansDescriptionCode 6380234 attribute is a Trans-portMeansDescriptionCode 6380238 datatype. The UpperBoundaryTransportMeans-DescriptionCode 6380234 attribute has a cardinality of zero or one 6380236 meaning that for each instance of the SelectionByItemTransportMeansDescriptionCode 6380212 entity there may be one UpperBoundaryTransportMeans-DescriptionCode 6380234 attribute.

The ItemScheduleLineAvailabilityDateTimePeriod 6380240 entity has a cardinality of zero or one 6380242 meaning that for each instance of the StockTransportPlanningOrderSelectionByElements 6380118 entity there may be one ItemScheduleLineAvailabilityDateTimePeriod, 6380240 entity. The ItemScheduleLineAvailability-DateTimePeriod 6380240 entity includes various attributes, namely StartDateTime 6380246 and EndDateTime 6380252.

The StartDateTime 6380246 attribute is a DateTime 6380250 datatype. The StartDateTime 6380246 attribute has a cardinality of zero or one 6380248 meaning that for each instance of the ItemScheduleLineAvailability-DateTimePeriod 6380240 entity there may be one StartDateTime 6380246 attribute.

The EndDateTime 6380252 attribute is a DateTime 6380256 datatype. The EndDateTime 6380252 attribute has a cardinality of zero or one 6380254 meaning that for each instance of the ItemScheduleLineAvailability-DateTimePeriod 6380240 entity there may be one EndDateTime 6380252 attribute.

The ItemScheduleLineRequirementDateTimePeriod 6380258 entity has a cardinality of zero or one 6380260 meaning that for each instance of the StockTransportPlanningOrderSelectionByElements 6380118 entity there may be one ItemScheduleLineRequirementDateTimePeriod 6380258 entity. The ItemScheduleLineRequirement-DateTimePeriod 6380258 entity includes various attributes, namely StartDateTime 6380264 and EndDateTime 6380270.

The StartDateTime 6380264 attribute is a DateTime 6380268 datatype. The StartDateTime 6380264 attribute has a cardinality of zero or one 6380266 meaning that for each instance of the ItemScheduleLineRequirement-DateTimePeriod 6380258 entity there may be one StartDateTime 6380264 attribute.

The EndDateTime 6380270 attribute is a DateTime 6380274 datatype. The EndDateTime 6380270 attribute has a cardinality of zero or one 6380272 meaning that for each instance of the ItemScheduleLineRequirement-DateTimePeriod 6380258 entity there may be one EndDateTime 6380270 attribute.

The ItemScheduleLineFixedIndicator 6380276 entity has a cardinality of zero or one 6380278 meaning that for each instance of the StockTransportPlanningOrder-SelectionByElements 6380118 entity there may be one ItemScheduleLineFixedIndicator 6380276 entity.

The SelectionOffsetNumber 6380282 entity has a cardinality of zero or one 6380284 meaning that for each instance of the StockTransportPlanningOrderSelectionByElements 6380118 entity there may be one SelectionOffsetNumber 6380282 entity.

The MaximumNumberValue 6380288 entity has a cardinality of zero or one 6380290 meaning that for each instance of the StockTransportPlanningOrderSelectionByElements 6380118 entity there may be one MaximumNumberValue 6380288 entity.

MessageHeader Package

A MessageHeader package groups the business information that is relevant for sending a business document in a message.

MessageHeader

A MessageHeader groups business information from the perspective of the sending application: namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

Selection Package

This package enables to query stock transport planning orders in the Supply And Demand Matching.

StockTransportPlanningOrderSelectionByElements

The StockTransportPlanningOrderByElementsSelection contains specified elements of the stock transport planning order to query stock transport planning order(s).

PlanningVersionID is a unique identifier for a Planning Version. It identifies the selected Planning Version.

SelectionByItemProductInternalID is a range of ProductInternalIDs. SelectionByItemProductInternalID includes InclusionExclusionCode (optional), a coded representation of the inclusion of a set into a result set or the exclusion of it; IntervalBoundaryTypeCode, a coded representation of an interval boundary type; LowerBoundaryProductInternalID (optional), a proprietary identifier for a ProductInternalID. The LowerBoundaryProductInternalID is the lower boundary of the ProductInternalID identifier interval; and UpperBoundaryProductInternalID (optional), a proprietary identifier for a ProductInternalID (the UpperBoundaryProductInternalID is the upper boundary of the ProductInternalID identifier interval).

SelectionByItemTargetLocationInternalID is a range of LocationInternalIDs. SelectionByItemTargetLocationInternalID includes InclusionExclusionCode (optional), a coded representation of the inclusion of a set into a result set or the exclusion of it; IntervalBoundaryTypeCode, a coded representation of an interval boundary type; LowerBoundaryLocationInternalID (optional), a proprietary identifier for a LocationInternalID (the LowerBoundaryLocationInternalID is the lower boundary of the LocationInternalID identifier interval); and UpperBoundaryLocationInternalID (optional), a proprietary identifier for a LocationInternalID (the UpperBoundaryLocationInternalID is the upper boundary of the LocationInternalID identifier interval).

SelectionByItemSourceLocationInternalID is a range of LocationInternalIDs. SelectionByItemSourceLocationInternalID includes InclusionExclusionCode (optional), a coded representation of the inclusion of a set into a result set or the exclusion of it; IntervalBoundaryTypeCode, a coded representation of an interval boundary type; LowerBoundaryLocationInternalID (optional), a proprietary identifier for a LocationInternalID (the LowerBoundaryLocationInternalID is the lower boundary of the LocationInternalID identifier interval); and UpperBoundaryLocationInternalID (optional), a proprietary identifier for a LocationInternalID (the UpperBoundaryLocationInternalID is the upper boundary of the LocationInternalID identifier interval).

SelectionByItemTransportMeansDescriptionCode is a range of TransportMeansDescriptionCodes. SelectionByItemTransportMeansDescriptionCode includes InclusionExclusionCode (optional), a coded representation of the inclusion of a set into a result set or the exclusion of it; IntervalBoundaryTypeCode, a coded representation of an interval boundary type; LowerBoundaryTransportMeansDescriptionCode (optional), a proprietary identifier for a TransportMeansDescriptionCode (the LowerBoundaryTransportMeansDescriptionCode is the lower boundary of the TransportMeansDescriptionCode identifier interval); and UpperBoundaryTransportMeansDescriptionCode (optional), a proprietary identifier for a TransportMeansDescriptionCode (the UpperBoundaryTransportMeansDescriptionCode is the upper boundary of the TransportMeansDescriptionCode identifier interval).

ItemScheduleLineAvailabilityDateTimePeriod is a period that is defined by two points in time. These points are expressed by GLOBAL_DateTime. ItemScheduleLineAvailabilityDateTimePeriod includes the start time-point, but excludes the end time-point. It gives the start and the end time of selection horizon for product availability at the target location.

ItemScheduleLineRequirementDateTimePeriod is a period that is defined by two points in time. These points are expressed by GLOBAL_DateTime. ItemScheduleLineRequirementDateTimePeriod includes the start time-point, but excludes the end time-point. It gives the start and the end time of selection horizon for product requirement at the source location.

ItemScheduleLineFixedIndicator (optional) indicator is the representation of a situation that has exactly two mutually exclusive Boolean values. The FixedIndicator gives the confirmed status of stock transport planning orders to be selected.

SelectionOffsetNumber (optional) NumberValue is a number. It gives the first stock transport planning order to be returned out of query results.

MaximumNumberValue (optional) NumberValue is a number. It gives the maximum number of stock transport planning orders to be returned out of query results.

InclusionExclusionCode="I" (inclusion) and IntervalBoundaryTypeCode=1 (single value) is supported.

SelectionOffsetNumber and MaximumNumberValue can be used to return selected stock transport planning orders in several packages if needed. Default values of these elements are default SelectionOffsetNumber is 0 and default MaximumNumberValue is 0, which means that matching stock transport planning orders shall be returned.

Message Data Type

The message data type StockTransportPlanningOrderByElementsResponseMessage_sync contains the StockTransportPlanningOrder included in the business document and the business information that is relevant for sending a business document in a message. FIGS. 639-1 through 639-7 show a StockTransportPlanningOrderByElementsResponseMessage_sync 639000 package. The StockTransportPlanningOrderByElementsResponseMessage_sync 639000 package is a StockTransportPlanningOrderByElementsResponseMessage_sync 639004 datatype. The StockTransportPlanningOrderByElementsResponseMessage_sync 639000 package includes a StockTransportPlanningOrderByElementsResponseMessage_sync 639002 entity. The StockTransportPlanningOrder- ByElementsResponseMessage_sync 639000 package includes various packages, namely MessageHeader 639006, StockTransportPlanningOrder 639038 and Log 6390182.

The MessageHeader 639006 package is a BasicBusinessDocumentMessageHeader 639012 datatype. The MessageHeader 639006 package includes a MessageHeader 639008 entity.

The MessageHeader 639008 entity has a cardinality of one 639010 meaning that for each instance of the StockTransportPlanningOrderByElementsResponseMessage_sync 639002 entity there is one MessageHeader 639008 entity. The MessageHeader 639008 entity includes various attributes, namely ID 639014, UUID 639020, ReferenceID 639026 and ReferenceUUID 639032.

The ID 639014 attribute is a BusinessDocumentMessageID 639018 datatype. The ID 639014 attribute has a cardinality of zero or one 639016 meaning that for each instance of the MessageHeader 639008 entity there may be one ID 639014 attribute.

The UUID 639020 attribute is an ATTRIBUTEINDEPENDENT_UUID 639024 datatype. The UUID 639020 attribute has a cardinality of zero or one 639022 meaning that for each instance of the MessageHeader 639008 entity there may be one UUID 639020 attribute.

The ReferenceID 639026 attribute is a BusinessDocumentMessageID 639030 datatype. The ReferenceID 639026 attribute has a cardinality of zero or one 639028 meaning that for each instance of the MessageHeader 639008 entity there may be one ReferenceID 639026 attribute.

The ReferenceUUID 639032 attribute is an ATTRIBUTEINDEPENDENT_UUID 639036 datatype. The ReferenceUUID 639032 attribute has a cardinality of zero or one 639034 meaning that for each instance of the MessageHeader 639008 entity there may be one ReferenceUUID 639032 attribute.

The StockTransportPlanningOrder 639038 package includes a StockTransportPlanningOrder 639040 entity. The StockTransportPlanningOrder 639038 package includes a StockTransportPlanningOrderItem 639056 package.

The StockTransportPlanningOrder 639040 entity has a cardinality of zero or n 639042 meaning that for each instance of the StockTransportPlanningOrderByElementsResponseMessage_sync 639002 entity there may be one or more StockTransportPlanningOrder 639040 entities. The StockTransportPlanningOrder 639040 entity includes various attributes, namely ID 639044 and PlanningVersionID 639050.

The ID 639044 attribute is a StockTransportPlanningOrderID 639048 datatype. The ID 639044 attribute has a cardinality of one 639046 meaning that for each instance of the StockTransportPlanningOrder 639040 entity there is one ID 639044 attribute.

The PlanningVersionID 639050 attribute is a PlanningVersionID 639054 datatype. The PlanningVersionID 639050 attribute has a cardinality of one 639052 meaning that for each instance of the StockTransportPlanningOrder 639040 entity there is one PlanningVersionID 639050 attribute.

The StockTransportPlanningOrderItem 639056 package includes a StockTransportPlanningOrderItem 639058 entity. The StockTransportPlanningOrderItem 639056 package includes a StockTransportPlanningOrderItemScheduleLine 639086 package.

The StockTransportPlanningOrderItem 639058 entity has a cardinality of one 639060 meaning that for each instance of the StockTransportPlanningOrder 639040 entity there is one StockTransportPlanningOrderItem 639058 entity. The StockTransportPlanningOrderItem 639058 entity includes various attributes, namely ProductInternalID 639062, TargetLocationInternalID 639068, SourceLocationInternalID 639074 and TransportMeansDescriptionCode 639080.

The ProductInternalID 639062 attribute is a ProductInternalID 639066 datatype. The ProductInternalID 639062 attribute has a cardinality of one 639064 meaning that for each instance of the StockTransportPlanningOrderItem 639058 entity there is one ProductInternalID 639062 attribute.

The TargetLocationInternalID 639068 attribute is a LocationInternalID 639072 datatype. The TargetLocationInternalID 639068 attribute has a cardinality of one 639070 meaning that for each instance of the StockTransportPlanningOrderItem 639058 entity there is one TargetLocationInternalID 639068 attribute.

The SourceLocationInternalID 639074 attribute is a LocationInternalID 639078 datatype. The SourceLocationInternalID 639074 attribute has a cardinality of one 639076 meaning that for each instance of the StockTransportPlanningOrderItem 639058 entity there is one SourceLocationInternalID 639074 attribute.

The TransportMeansDescriptionCode 639080 attribute is a TransportMeansDescriptionCode 639084 datatype. The TransportMeansDescriptionCode 639080 attribute has a cardinality of one 639082 meaning that for each instance of the StockTransportPlanningOrderItem 639058 entity there is one TransportMeansDescriptionCode 639080 attribute.

The StockTransportPlanningOrderItemScheduleLine 639086 package includes a StockTransportPlanningOrderItemScheduleLine 639088 entity.

The StockTransportPlanningOrderItemScheduleLine 639088 entity has a cardinality of one 639090 meaning that for each instance of the StockTransportPlanningOrderItem 639058 entity there is one StockTransportPlanningOrderItemScheduleLine 639088 entity. The StockTransportPlanningOrderItemScheduleLine 639088 entity includes various attributes, namely Quantity 639092, AvailabilityDateTime 639098, FixedIndicator 6390104, GoodsReceiptDuration 6390110, GoodsReceiptCapacity 6390116, GoodsReceiptResourceID 6390122, DeliveryDateTime 6390128, TransportDuration 6390134, TransportCapacity 6390140, TransportResourceID 6390146, ShipmentDateTime 6390152, GoodsIssueDuration 6390158, GoodsIssueCapacity 6390164, GoodsIssueResourceID 6390170 and RequirementDateTime 6390176.

The Quantity 639092 attribute is a Quantity 639096 datatype. The Quantity 639092 attribute has a cardinality of one 639094 meaning that for each instance of the StockTransportPlanningOrderItemScheduleLine 639088 entity there is one Quantity 639092 attribute.

The AvailabilityDateTime 639098 attribute is a GLOBAL_DateTime 6390102 datatype. The AvailabilityDateTime 639098 attribute has a cardinality of one 6390100 meaning that for each instance of the StockTransportPlanningOrderItemScheduleLine 639088 entity there is one AvailabilityDateTime 639098 attribute.

The FixedIndicator 6390104 attribute is an Indicator 6390108 datatype. The FixedIndicator 6390104 attribute has a cardinality of one 6390106 meaning that for each instance of the StockTransportPlanningOrderItemScheduleLine 639088 entity there is one FixedIndicator 6390104 attribute.

The GoodsReceiptDuration 6390110 attribute is a Duration 6390114 datatype. The GoodsReceiptDuration 6390110 attribute has a cardinality of one 6390112 meaning that for each instance of the StockTransportPlanningOrderItemScheduleLine 639088 entity there is one GoodsReceiptDuration 6390110 attribute.

The GoodsReceiptCapacity 6390116 attribute is a Quantity 6390120 datatype. The GoodsReceiptCapacity 6390116 attribute has a cardinality of zero or one 6390118 meaning that for each instance of the StockTransportPlanningOrderItemScheduleLine 639088 entity there may be one GoodsReceiptCapacity 6390116 attribute.

The GoodsReceiptResourceID 6390122 attribute is a ResourceID 6390126 datatype. The GoodsReceiptResourceID 6390122 attribute has a cardinality of zero or one 6390124 meaning that for each instance of the StockTransportPlanningOrderItemScheduleLine 639088 entity there may be one GoodsReceiptResourceID 6390122 attribute.

The DeliveryDateTime 6390128 attribute is a GLOBAL_DateTime 6390132 datatype. The DeliveryDateTime 6390128 attribute has a cardinality of one 6390130 meaning that for each instance of the StockTransportPlanningOrderItemScheduleLine 639088 entity there is one DeliveryDateTime 6390128 attribute.

The TransportDuration 6390134 attribute is a Duration 6390138 datatype. The TransportDuration 6390134 attribute has a cardinality of one 6390136 meaning that for each instance of the StockTransportPlanningOrderItemScheduleLine 639088 entity there is one TransportDuration 6390134 attribute.

The TransportCapacity 6390140 attribute is a Quantity 6390144 datatype. The TransportCapacity 6390140 attribute has a cardinality of zero or one 6390142 meaning that for each instance of the StockTransportPlanningOrderItemScheduleLine 639088 entity there may be one TransportCapacity 6390140 attribute.

The TransportResourceID 6390146 attribute is a ResourceID 6390150 datatype. The TransportResourceID 6390146 attribute has a cardinality of zero or one 6390148 meaning that for each instance of the StockTransportPlanningOrderItemScheduleLine 639088 entity there may be one TransportResourceID 6390146 attribute.

The ShipmentDateTime 6390152 attribute is a GLOBAL_DateTime 6390156 datatype. The ShipmentDateTime 6390152 attribute has a cardinality of one 6390154 meaning that for each instance of the StockTransportPlanningOrderItemScheduleLine 639088 entity there is one ShipmentDateTime 6390152 attribute.

The GoodsIssueDuration 6390158 attribute is a Duration 6390162 datatype. The GoodsIssueDuration 6390158 attribute has a cardinality of one 6390160 meaning that for each instance of the StockTransportPlanningOrderItemScheduleLine 639088 entity there is one GoodsIssueDuration 6390158 attribute.

The GoodsIssueCapacity 6390164 attribute is a Quantity 6390168 datatype. The GoodsIssueCapacity 6390164 attribute has a cardinality of zero or one 6390166 meaning that for each instance of the StockTransportPlanningOrderItemScheduleLine 639088 entity there may be one GoodsIssueCapacity 6390164 attribute.

The GoodsIssueResourceID 6390170 attribute is a ResourceID 6390174 datatype. The GoodsIssueResourceID 6390170 attribute has a cardinality of zero or one 6390172 meaning that for each instance of the StockTransportPlanningOrderItemScheduleLine 639088 entity there may be one GoodsIssueResourceID 6390170 attribute.

The RequirementDateTime 6390176 attribute is a GLOBAL_DateTime 6390180 datatype. The RequirementDateTime 6390176 attribute has a cardinality of one 6390178 meaning that for each instance of the StockTransportPlanningOrderItemScheduleLine 639088 entity there is one RequirementDateTime 6390176 attribute.

The Log 6390182 package is a Log 6390188 datatype. The Log 6390182 package includes a Log 6390184 entity.

The Log 6390184 entity has a cardinality of one 6390186 meaning that for each instance of the StockTransportPlanningOrderByElementsResponseMessage_sync 639002 entity there is one Log 6390184 entity. The Log 6390184 entity includes various attributes, namely BusinessDocumentProcessingResultCode 6390190, MaximumLogItemSeverityCode 6390196 and Item 6390202.

The BusinessDocumentProcessingResultCode 6390190 attribute is a ProcessingResultCode 6390194 datatype. The BusinessDocumentProcessingResultCode 6390190 attribute has a cardinality of zero or one 6390192 meaning that for each instance of the Log 6390184 entity there may be one BusinessDocumentProcessingResultCode 6390190 attribute.

The MaximumLogItemSeverityCode 6390196 attribute is a LogItemSeverityCode 6390200 datatype. The MaximumLogItemSeverityCode 6390196 attribute has a cardinality of zero or one 6390198 meaning that for each instance of the Log 6390184 entity there may be one MaximumLogItemSeverityCode 6390196 attribute.

The Item 6390202 attribute is a LogItem 6390206 datatype. The Item 6390202 attribute has a cardinality of zero or n 6390204 meaning that for each instance of the Log 6390184 entity there may be one or more Item 6390202 attributes.

MessageHeader Package

A MessageHeader package groups the business information that is relevant for sending a business document in a message.

MessageHeader

A MessageHeader groups business information from the perspective of the sending application, namely information to identify the business document in a message, information about the sender, and (possibly) information about the recipient. The BusinessScopeBusinessProcess is used to transfer the Supply Planning Simulation ID. The consumer is not recommended to populate TestDataIndicator and ReconciliationIndicator.

StockTransportPlanningOrder Package

The StockTransportPlanningOrder package groups the Stock Transport Planning Order relevant information.

StockTransportPlanningOrder

A StockTransportPlanningOrder is a planned order to transport a certain quantity of a product from the stock of a source location to a target location at a given time. A StockTransportPlanningOrderID is a unique identifier for a Stock Transport Planning Order. It identifies the created StockTransportPlanningOrder.

Log Package

A log is a sequence of messages that result when an application executes a task.

StrategicInvestmentBuy Interface

Across many industries cost savings in procurement are of particular importance for the overall margin of a company. If purchasing discounts are offered by a supplier, a tool to analyze cost savings versus additional costs delivers a huge benefit to a buyer. StrategicInvestmentBuy supports a buyer in a scenario where such a discount is offered. It compares the cost savings against costs for storage of additional goods. Additionally, it delivers information such as stock on hand, consumption and open purchase order quantity. If it is profitable, it finally proposes a purchase order quantity and order date.

Message Choreography

The message choreography of FIG. 648 describes a possible logical sequence of messages that can be used to realize a strategic investment buy simulation business scenario.

The StrategicInvestmentBuySimulateQuery_sync is a Query from the buyer to PurchaseOrderProcessing to simulate cost savings and to propose an order quantity and an order date. The structure of the message type StrategicInvestmentBuySimulateQuery_sync is specified by the message data type StrategicInvestmentBuySimulateQueryMessage_sync. There is no persistence by this message type.

The StrategicInvestmentBuySimulateResponse_sync is a response to StrategicInvestmentBuySimulateQuery_sync. It contains cost savings and, if it is profitable, it also contains order quantity and order date. The structure of the message type StrategicInvestmentBuySimulateResponse_sync is specified by the message data type StrategicInvestmentBuySimulateResponseMessage_sync.

For example, a "Buyer" system 648002 can query a strategic investment buy simulation using the StrategicInvestmentBuySimulateQuery_sync message 648006 as shown, for example, in FIG. 649. A "Purchase Order Processing" system 648004 can respond to the query using the StrategicInvestmentBuySimulateResponse_sync message 648008 as shown, for example, in FIG. 650.

Message Data Type

The message data type StrategicInvestmentBuySimulateQueryMessage_sync contains the StrategicInvestmentBuySimulateQuery included in the business document and the business information that is relevant for sending a business document in a message.

The message data type StrategicInvestmentBuySimulateQueryMessage_sync provides the structure for the message type StrategicInvestmentBuySimulateQuery_sync and the interfaces that are based on them.

FIGS. 651-1 through 651-7 show a StrategicInvestmentBuySimulateQueryMessage 651000 package. The StrategicInvestmentBuySimulateQueryMessage 651000 package is a <MessageDataType> 651004 datatype. The StrategicInvestmentBuySimulateQueryMessage 651000 package includes a StrategicInvestmentBuySimulateQueryMessage 651002 entity. The StrategicInvestmentBuySimulateQueryMessage 651000 package includes various packages, namely MessageHeader 651006 and StrategicInvestmentBuySimulateQuery 651028.

The MessageHeader 651006 package is a BusinessDocumentMessageHeader 651012 datatype. The MessageHeader 651006 package includes a MessageHeader 651008 entity.

The MessageHeader 651008 entity has a cardinality of one 651010 meaning that for each instance of the StrategicInvestmentBuySimulateQueryMessage 651002 entity there is one MessageHeader 651008 entity. The MessageHeader 651008 entity includes various attributes, namely ID 651014 and CreationDateTime 651020.

The ID 651014 attribute is a BusinessDocumentMessageID 651018 datatype. The ID 651014 attribute has a cardinality of one 651016 meaning that for each instance of the MessageHeader 651008 entity there is one ID 651014 attribute.

The CreationDateTime 651020 attribute is a DateTime 651024 datatype. The CreationDateTime 651020 attribute has a cardinality of one 651022 meaning that for each instance of the MessageHeader 651008 entity there is one CreationDateTime 651020 attribute.

The StrategicInvestmentBuySimulateQuery 651028 package includes a StrategicInvestmentBuySimulateQuery 651030 entity. The StrategicInvestmentBuySimulateQuery 651028 package includes various packages, namely Discount 651034 and Item 651056.

The StrategicInvestmentBuySimulateQuery 651030 entity has a cardinality of one 651032 meaning that for each instance of the StrategicInvestmentBuySimulateQueryMessage 651002 entity there is one StrategicInvestmentBuySimulateQuery 651030 entity.

The Discount 651034 package includes a Discount 651036 entity.

The Discount 651036 entity includes various attributes, namely DiscountPercent 651038, MinimumOrderedAmount 651044 and ValidityTimePointPeriod 651050.

The DiscountPercent 651038 attribute is a Percent 651042 datatype. The DiscountPercent 651038 attribute has a cardinality of zero or one 651040 meaning that for each instance of the Discount 651036 entity there may be one DiscountPercent 651038 attribute.

The MinimumOrderedAmount 651044 attribute is an Amount 651048 datatype. The MinimumOrderedAmount 651044 attribute has a cardinality of zero or one 651046 meaning that for each instance of the Discount 651036 entity there may be one MinimumOrderedAmount 651044 attribute.

The ValidityTimePointPeriod 651050 attribute is a TimePointPeriod 651054 datatype. The ValidityTimePointPeriod 651050 attribute has a cardinality of zero or one 651052 meaning that for each instance of the Discount 651036 entity there may be one ValidityTimePointPeriod 651050 attribute.

The Item 651056 package includes an Item 651058 entity. The Item 651056 package includes various packages, namely ProductInformation 651060, Plant 6510108, Discount 6510118 and ProductProcurementArrangement 6510140.

The ProductInformation 651060 package includes a ProductInformation 651062 entity.

The ProductInformation 651062 entity includes various attributes, namely ProductInternalID 651064, StorageCostAmount 651070, OrderRate 651076 and BaseRate 651082. The ProductInformation 651062 entity includes a Quantities 651088 subordinate entity.

The ProductInternalID 651064 attribute is a ProductInternalID 651068 datatype. The ProductInternalID 651064 attribute has a cardinality of one 651066 meaning that for each instance of the ProductInformation 651062 entity there is one ProductInternalID 651064 attribute.

The StorageCostAmount 651070 attribute is an Amount 651074 datatype. The StorageCostAmount 651070 attribute has a cardinality of zero or one 651072 meaning that for each instance of the ProductInformation 651062 entity there may be one StorageCostAmount 651070 attribute.

The OrderRate 651076 attribute is a Rate 651080 datatype. The OrderRate 651076 attribute has a cardinality of one 651078 meaning that for each instance of the ProductInformation 651062 entity there is one OrderRate 651076 attribute.

The BaseRate 651082 attribute is a Rate 651086 datatype. The BaseRate 651082 attribute has a cardinality of one 651084 meaning that for each instance of the ProductInformation 651062 entity there is one BaseRate 651082 attribute.

The Quantities 651088 entity includes various attributes, namely LocationInventoryQuantity 651090, OpenQuantity 651096 and MonthlyConsumptionQuantity 6510102.

The LocationInventoryQuantity 651090 attribute is a Quantity 651094 datatype. The LocationInventoryQuantity 651090 attribute has a cardinality of zero or one 651092 meaning that for each instance of the Quantities 651088 entity there may be one LocationInventoryQuantity 651090 attribute.

The OpenQuantity 651096 attribute is a Quantity 6510100 datatype. The OpenQuantity 651096 attribute has a cardinality of zero or one 651098 meaning that for each instance of the Quantities 651088 entity there may be one OpenQuantity 651096 attribute.

The MonthlyConsumptionQuantity 6510102 attribute is a Quantity 6510106 datatype. The MonthlyConsumptionQuantity 6510102 attribute has a cardinality of one 6510104 meaning that for each instance of the Quantities 651088 entity there is one MonthlyConsumptionQuantity 6510102 attribute.

The Plant 6510108 package includes a Plant 6510110 entity.

The Plant 6510110 entity includes a PlantId 6510112 attribute.

The PlantId 6510112 attribute is a PlantID 6510116 datatype. The PlantId 6510112 attribute has a cardinality of one 6510114 meaning that for each instance of the Plant 6510110 entity there is one PlantId 6510112 attribute.

The Discount 6510118 package includes a Discount 6510120 entity.

The Discount 6510120 entity includes various attributes, namely DiscountPercent 6510122, DiscountAmount 6510128 and NewPrice 6510134.

The DiscountPercent 6510122 attribute is a Percent 6510126 datatype. The DiscountPercent 6510122 attribute has a cardinality of zero or one 6510124 meaning that for each instance of the Discount 6510120 entity there may be one DiscountPercent 6510122 attribute.

The DiscountAmount 6510128 attribute is an Amount 6510132 datatype. The DiscountAmount 6510128 attribute has a cardinality of zero or one 6510130 meaning that for each instance of the Discount 6510120 entity there may be one DiscountAmount 6510128 attribute.

The NewPrice 6510134 attribute is a Price 6510138 datatype. The NewPrice 6510134 attribute has a cardinality of zero or one 6510136 meaning that for each instance of the Discount 6510120 entity there may be one NewPrice 6510134 attribute.

The ProductProcurementArrangement 6510140 package includes a ProductProcurementArrangement 6510142 entity.

The ProductProcurementArrangement 6510142 entity includes various attributes, namely ProductProcurementArrangementID 6510144, CurrentPrice 6510150, OrderPriceRate 6510156, PartyId 6510162 and OrganisationalCentreId 6510168.

The ProductProcurementArrangementID 6510144 attribute is a ProductProcurementArrangementID 6510148 datatype. The ProductProcurementArrangementID 6510144 attribute has a cardinality of one 6510146 meaning that for each instance of the ProductProcurementArrangement 6510142 entity there is one ProductProcurementArrangementID 6510144 attribute.

The CurrentPrice 6510150 attribute is a Price 6510154 datatype. The CurrentPrice 6510150 attribute has a cardinality of one 6510152 meaning that for each instance of the ProductProcurementArrangement 6510142 entity there is one CurrentPrice 6510150 attribute.

The OrderPriceRate 6510156 attribute is a Rate 6510160 datatype. The OrderPriceRate 6510156 attribute has a cardinality of one 6510158 meaning that for each instance of the ProductProcurementArrangement 6510142 entity there is one OrderPriceRate 6510156 attribute.

The PartyId 6510162 attribute is a PartyID 6510166 datatype. The PartyId 6510162 attribute has a cardinality of one 6510164 meaning that for each instance of the ProductProcurementArrangement 6510142 entity there is one PartyId 6510162 attribute.

The OrganisationalCentreId 6510168 attribute is an OrganisationalCentreID 6510172 datatype. The OrganisationalCentreId 6510168 attribute has a cardinality of one 6510170 meaning that for each instance of the ProductProcurementArrangement 6510142 entity there is one OrganisationalCentreId 6510168 attribute.

StrategicInvestmentBuySimulateQuery Package

The StrategicInvestmentBuySimulateQuery package groups the StrategicInvestmentBuySimulateQuery with its packages. StrategicInvestmentBuy is used to simulate an optimal purchase order quantity and possible cost saving by comparing an offered discount with costs for additional storing of goods. During simulation it takes also consumption, inventory and open purchase order quantity into account. If cost savings are higher than additional costs (i.e. it is profitable), it finally proposes a purchase order quantity and order date.

Discount Package

The Discount package contains the discount for several material items in the StrategicInvestmentBuySimulateQuery message.

Discount

A discount represents a rebate given by a vendor for all selected materials. The discount is time-dependent. DiscountPercent is a discount number that relates to the comparison FIG. 100. MinimumOrderedAmount is the minimum amount to be ordered with the corresponding currency unit. ValidityTimePointPeriod is a period, in which something is valid, defined by two points in time of the same type. It is determined by a start time-point and an end time-point, duration and a start time point, or duration with an end time point.

Item Package

The Item package groups items with its packages.

ProductInformation Package

The ProductInformation package groups all product information that occurs in the StrategicInvestmentBuySimulateQuery_sync message.

Material

A Material is the collection of detailed information for a single material ID. ProductInternalID is a ProductInternalID is a proprietary identifier for a product. StorageCostAmount is the cost amount caused by storage with the corresponding currency unit. OrderRate is a fraction between order unit of measure and base unit of measure whose numerator and denominator are quantities, values, or dimensionless factors, independently from each other.

BaseRate is a fraction of base unit of measure whose numerator and denominator are quantities, values, or dimensionless factors, independently from each other.

Quantities

Entity Quantities contains all quantity parameters which are considered for simulation.

LocationInventoryQuantity is inventory quantity per location with the non-monetary numerical specification of an amount in a unit of measurement. OpenQuantity is an open quantity with the non-monetary numerical specification of an amount in a unit of measurement. MonthlyConsumptionQuantity is the monthly consumption quantity with the non-monetary numerical specification of an amount in a unit of measurement.

Plant Package

The plant package groups all plant information that occurs in the StrategicInvestmentBuySimulateQuery_sync message.

Plant

Plant is the identification, description and classification of a plant. PlantID is a unique identifier for a location.

Discount Package

The Discount package contains the discount for a specific material in the StrategicInvestmentBuySimulateQuery_sync message.

Discount

A discount represents a vendor given rebate for a specific material. The discount is time-dependent. DiscountPercent is a discount number that relates to the comparison FIG. 100.

DiscountAmount is the discount amount to be given with the corresponding currency unit.

NewPrice is the new price expressed in a monetary unit, of a product or a service in relation to a basic amount. Discount is optional on header and item level, but it has to be given on one of these levels. If it is given only one attribute in discount package may be filled.

ProductProcurementArrangement Package

The ProductProcurementArrangement package groups all information from product purchasing arrangement that occurs in the StrategicInvestmentBuySimulateQuery_sync message. This package is obligatory for the StrategicInvestmentBuySimulateQuery_sync.

ProductProcurementArrangement

ProductProcurementArrangement is source of information for the procurement of a certain material or service from a certain vendor. ProductProcurementArrangementID is a unique identifier for a ProductProcurementArrangement. CurrentPrice is the current price expressed in a monetary unit, of a product or a service in relation to a basic amount. OrderPriceRate is a fraction between order price unit of measure and order unit of measure whose numerator and denominator are quantities, values, or dimensionless factors, independently from each other. PartyID is a unique identifier for a party. OrganisationalCentreID is a unique identifier of an organizational unit. PlantID is an identifier for a plant. ProductInternalID is a proprietary identifier for a product.

Message Data Type

The message data type StrategicInvestmentBuySimulateResponseMessage_sync contains the StrategicInvestmentBuySimulateResponse included in the business document and the business information that is relevant for sending a business document in a message. The message type StrategicInvestmentBuySimulateResponseMessage_sync does not change data during the process Strategic Investment Buying Simulation, there is no persistence. The message data type StrategicInvestmentBuySimulateResponseMessage_sync provides the structure for the message type StrategicInvestmentBuySimulateResponse_sync and the interfaces that are based on them.

FIGS. 652-1 through 652-6 show a StrategicInvestmentBuySimulateResponseMessage 652000 package. The StrategicInvestmentBuySimulateResponseMessage 652000 package is a <MessageDataType> 652004 datatype. The StrategicInvestmentBuySimulateResponseMessage 652000 package includes a StrategicInvestmentBuySimulateResponseMessage 652002 entity. The StrategicInvestmentBuySimulateResponseMessage 652000 package includes various packages, namely MessageHeader 652006 and StrategicInvestmentBuySimulateResponse 652028.

The MessageHeader 652006 package is a BusinessDocumentMessageHeader 652012 datatype. The MessageHeader 652006 package includes a MessageHeader 652008 entity. The MessageHeader 652008 entity has a cardinality of one 652010 meaning that for each instance of the StrategicInvestmentBuySimulateResponseMessage 652002 entity there is one MessageHeader 652008 entity. The MessageHeader 652008 entity includes various attributes, namely ID 652014 and CreationDateTime 652020.

The ID 652014 attribute is a BusinessDocumentMessageID 652018 datatype. The ID 652014 attribute has a cardinality of one 652016 meaning that for each instance of the MessageHeader 652008 entity there is one ID 652014 attribute.

The CreationDateTime 652020 attribute is a DateTime 652024 datatype. The CreationDateTime 652020 attribute has a cardinality of one 652022 meaning that for each instance of the MessageHeader 652008 entity there is one CreationDateTime 652020 attribute.

The StrategicInvestmentBuySimulateResponse 652028 package includes a StrategicInvestmentBuySimulateResponse 652030 entity. The StrategicInvestmentBuySimulateResponse 652028 package includes various packages, namely CostSavings 652034, TotalOrderAmount 652044 and Item 652054.

The StrategicInvestmentBuySimulateResponse 652030 entity has a cardinality of one 652032 meaning that for each instance of the StrategicInvestmentBuySimulateResponseMessage 652002 entity there is one StrategicInvestmentBuySimulateResponse 652030 entity.

The CostSavings 652034 package includes a CostSavings 652036 entity. The CostSavings 652036 entity includes a SavedCostAmount 652038 attribute.

The SavedCostAmount 652038 attribute is an Amount 652042 datatype. The SavedCostAmount 652038 attribute has a cardinality of zero or one 652040 meaning that for each instance of the CostSavings 652036 entity there may be one SavedCostAmount 652038 attribute.

The TotalOrderAmount 652044 package includes a ProposedTotalAmount 652046 entity. The ProposedTotalAmount 652046 entity includes a ProposedTotalAmount 652048 attribute. The ProposedTotalAmount 652048 attribute is an Amount 652052 datatype. The ProposedTotalAmount 652048 attribute has a cardinality of zero or one 652050 meaning that for each instance of the ProposedTotalAmount 652046 entity there may be one ProposedTotalAmount 652048 attribute.

The Item 652054 package includes an Item 652056 entity. The Item 652054 package includes various packages, namely ProductInformation 652058, CostSavings 652086, PurchaseOrderProposal 6520102 and StrategicInvestmentBuyGrafics 6520124.

The ProductInformation 652058 package includes a ProductInformation 652060 entity.

The ProductInformation 652060 entity includes various attributes, namely ProductInternalID 652062, StorageCostAmount 652068, OrderRate 652074 and BaseRate 652080.

The ProductInternalID 652062 attribute is a ProductInternalID 652066 datatype. The ProductInternalID 652062 attribute has a cardinality of one 652064 meaning that for each instance of the ProductInformation 652060 entity there is one ProductInternalID 652062 attribute.

The StorageCostAmount 652068 attribute is an Amount 652072 datatype. The StorageCostAmount 652068 attribute has a cardinality of zero or one 652070 meaning that for each instance of the ProductInformation 652060 entity there may be one StorageCostAmount 652068 attribute.

The OrderRate 652074 attribute is a Rate 652078 datatype. The OrderRate 652074 attribute has a cardinality of one 652076 meaning that for each instance of the ProductInformation 652060 entity there is one OrderRate 652074 attribute.

The BaseRate 652080 attribute is a Rate 652084 datatype. The BaseRate 652080 attribute has a cardinality of one 652082 meaning that for each instance of the ProductInformation 652060 entity there is one BaseRate 652080 attribute.

The CostSavings 652086 package includes a CostSavingsAmount 652088 entity.

The CostSavingsAmount 652088 entity includes various attributes, namely SavedCostAmount 652090 and NewPrice 652096.

The SavedCostAmount 652090 attribute is an Amount 652094 datatype. The SavedCostAmount 652090 attribute has a cardinality of zero or one 652092 meaning that for each instance of the CostSavingsAmount 652088 entity there may be one SavedCostAmount 652090 attribute.

The NewPrice 652096 attribute is a Price 6520100 datatype. The NewPrice 652096 attribute has a cardinality of zero or one 652098 meaning that for each instance of the CostSavingsAmount 652088 entity there may be one NewPrice 652096 attribute.

The PurchaseOrderProposal 6520102 package includes a PurchaseOrderProposal 6520104 entity.

The PurchaseOrderProposal 6520104 entity includes various attributes, namely ProposedOrderQuantity 6520106, ProposedOrderingTimePoint 6520112 and ProposedOrderedAmount 6520118.

The ProposedOrderQuantity 6520106 attribute is a Quantity 6520110 datatype. The ProposedOrderQuantity 6520106 attribute has a cardinality of zero or one 6520108 meaning that for each instance of the PurchaseOrderProposal 6520104 entity there may be one ProposedOrderQuantity 6520106 attribute.

The ProposedOrderingTimePoint 6520112 attribute is a Date 6520116 datatype. The ProposedOrderingTimePoint 6520112 attribute has a cardinality of zero or one 6520114 meaning that for each instance of the PurchaseOrderProposal 6520104 entity there may be one ProposedOrderingTimePoint 6520112 attribute.

The ProposedOrderedAmount 6520118 attribute is an Amount 6520122 datatype. The ProposedOrderedAmount 6520118 attribute has a cardinality of zero or one 6520120 meaning that for each instance of the PurchaseOrderProposal 6520104 entity there may be one ProposedOrderedAmount 6520118 attribute.

The StrategicInvestmentBuyGrafics 6520124 package includes a StrategicInvestmentBuyDetail 6520126 entity.

The StrategicInvestmentBuyDetail 6520126 entity includes various attributes, namely ProductInternalID 6520128, PlantID 6520134, ProposedOrderedQuantity 6520140, SavedCostAmount 6520146 and WeekCounterValue 6520152.

The ProductInternalID 6520128 attribute is a ProductInternalID 6520132 datatype. The ProductInternalID 6520128 attribute has a cardinality of one 6520130 meaning that for each instance of the StrategicInvestmentBuyDetail 6520126 entity there is one ProductInternalID 6520128 attribute.

The PlantID 6520134 attribute is a PlantID 6520138 datatype. The PlantID 6520134 attribute has a cardinality of one 6520136 meaning that for each instance of the StrategicInvestmentBuyDetail 6520126 entity there is one PlantID 6520134 attribute.

The ProposedOrderedQuantity 6520140 attribute is a Quantity 6520144 datatype. The ProposedOrderedQuantity 6520140 attribute has a cardinality of one 6520142 meaning that for each instance of the StrategicInvestmentBuyDetail 6520126 entity there is one ProposedOrderedQuantity 6520140 attribute.

The SavedCostAmount 6520146 attribute is an Amount 6520150 datatype. The SavedCostAmount 6520146 attribute has a cardinality of one 6520148 meaning that for each instance of the StrategicInvestmentBuyDetail 6520126 entity there is one SavedCostAmount 6520146 attribute.

The WeekCounterValue 6520152 attribute is a CounterValue 6520156 datatype. The WeekCounterValue 6520152 attribute has a cardinality of one 6520154 meaning that for each instance of the StrategicInvestmentBuyDetail 6520126 entity there is one WeekCounterValue 6520152 attribute.

StrategicInvestmentBuySimulateResponse Package

The StrategicInvestmentBuySimulateResponse package groups the StrategicInvestmentBuySimulateResponse with its packages. StrategicInvestmentBuy is used to simulate an optimal purchase order quantity and possible cost saving by comparing an offered discount with costs for additional storing of goods. During simulation it takes also consumption, inventory and open purchase order quantity into account. If cost savings are higher than additional costs (i.e. it is profitable), it finally proposes a purchase order quantity and order date.

StrategicInvestmentBuy is used to simulate an optimal purchase order quantity and possible cost saving by comparing an offered discount with costs for additional storing of goods. During simulation it takes also consumption, inventory and open purchase order quantity into account. If cost savings are higher than additional costs (i.e. it is profitable), it finally proposes a purchase order quantity and order date.

CostSavings Package

The CostSavings package contains the profitable cost savings that occurs in the StrategicInvestmentBuySimulateResponse_sync message.

CostSavings

CostSavings represents the cost savings of all selected materials, calculated as the difference between a current price and a new price and the additional storage costs. SavedCostAmount is the saved cost amount with the corresponding currency unit.

ProposedTotalAmount Package

The ProposedTotalAmount package contains the sum of all calculated ordered amounts (of all items) that occurs in the StrategicInvestmentBuySimulateResponse_sync message.

ProposedTotalAmount

ProposedTotalAmount represents the sum of the proposed order values of all selected materials, calculated during StrategicInvestmentBuySimulation. ProposedTotalAmount is the total proposed amount with the corresponding currency unit.

Item Package

The Item package groups items with its packages.

Material Package

The Material package can contain the entity Material.

Plant Package

CostSavings Package

The CostSavings package contains the simulated cost savings for a specific material that occurs in the StrategicInvestmentBuySimulateResponse_sync message.

CostSavings

CostSavings represents the cost savings of a specific material (only for one item), calculated as the difference between a current price and new price and the additional storage costs. SavedCostAmount is the saved cost amount with the corresponding currency unit.

NewPrice is the new price expressed in a monetary unit, of a product or a service in relation to a basic amount.

PurchaseOrderProposal Package

The PurchaseOrderProposal package groups the simulated order quantity and order date that occurs in the StrategicInvestmentBuySimulateResponse_sync message.

PurchaseOrderProposal

PurchaseOrderProposal represents the simulated purchase order quantity, ordered amount and order date for a specific material. ProposedOrderQuantity is the ordered quantity with the non-monetary numerical specification of an amount in a unit of measurement. ProposedOrderingTimePoint is an exact day in the Gregorian calendar. ProposedOrderedAmount is the ordered amount with the corresponding currency unit.

CalculationResult Package

The CalculationResult package contains all simulated order quantity and cost savings for each material that occurs in the StrategicInvestmentBuySimulateResponse_sync message.

CalculationResult

CalculationResult represents all simulated purchase order quantities and cost savings for every material and every week to be simulated. These data can be used to visualize the simulation results. ProductInternalID is a proprietary identifier for a product. PlantId is a unique identifier for a location. ProposedOrderedQuantity is the ordered quantity with the non-monetary numerical specification of an amount in a unit of measurement. SavedCostAmount is the saved cost amount with the corresponding currency unit. WeekCounterValue specifies a value that counts a number that changes in fixed increments.

Log

A Log package groups the messages used for user interaction. A Log is a sequence of messages that result when an application executes a task.

SupplyPlanningArea Interfaces

Master Data Maintenance is a centralized department that deals with requests from different departments for one of the following functionalities: Create master data object, Change master data object, Deactivate master data object, Read master data object Message Choreography The message choreography of FIG. 653-1 describes a possible logical sequence of messages that can be used to realize a supply planning area business scenario.

Message Type SupplyPlanningAreaByLocationIDAndLocationTypeCodeQuery

A SupplyPlanningAreaByLocationIDAndLocationTypeCodeQuery is an inquiry to Location Data Management for a list of SupplyPlanningAreas. The structure of the message type SupplyPlanningAreaByLocationIDAndLocationTypeCodeQuery is specified by the message data type SupplyPlanningAreaByLocationIDAndLocationTypeCodeQueryMessage.

Message Type SupplyPlanningAreaByLocationIDAndLocationTypeCodeResponse

A SupplyPlanningAreaByLocationIDAndLocationTypeCodeResponse is the response to SupplyPlanningAreaByLocationIDAndLocationTypeCodeQuery. The structure of the message type SupplyPlanningAreaByLocationIDAndTypeCodeResponse is specified by the message data type SupplyPlanningAreaByLocationIDAndTypeCodeResponseMessage.

For example, a "Master Data Maintenance Department" system 653002 can query a supply planning area by location ID and location type using the SupplyPlanningAreaByLocationIDAndLocationTypeCodeQuery asynchronous message 653004 as shown, for example, in FIG. 654. A "Location Data Management" system 653004 can respond to the query using the SupplyPlanningAreaByLocationIDAndLocationTypeCodeResponse asynchronous message 653006 as shown, for example, in FIG. 655.

Message Data Type

The message data type SupplyPlanningAreaByLocationIDAndLocationTypeCodeQueryMessage contains the business information that is relevant for sending a business document in a message and the Selection in the business document. The message data type SupplyPlanningAreaByLocationIDAndLocationTypeCodeQueryMessage provides the structure for the message type SupplyPlanningAreaByLocationIDAndLocationTypeCodeQuery and the interfaces based on it. FIGS. 664-1 through 664-3 show a SupplyPlanningAreaByLocationIDAndLocationTypeCodeQueryMessage 664000 package. The SupplyPlanningAreaByLocationIDAndLocationTypeCodeQuery Message 664000 package is a SupplyPlanningAreaByLocationIDAndLocationTypeCodeQueryMessage 664004 datatype. The SupplyPlanningAreaByLocationIDAndLocationTypeCodeQueryMessage 664000 package includes a SupplyPlanningAreaByLocationIDAndLocationTypeCodeQueryMessage 664002 entity. The SupplyPlanningAreaByLocationIDAndLocationTypeCodeQueryMessage 664000 package includes various packages, namely MessageHeader 664006 and Selection 664014.

The MessageHeader 664006 package is a BusinessDocumentMessageHeader 664012 datatype. The MessageHeader 664006 package includes a MessageHeader 664008 entity.

The MessageHeader 664008 entity has a cardinality of one 664010 meaning that for each instance of the SupplyPlanningAreaByLocationIDAndLocationTypeCodeQueryMessage 664002 entity there is one MessageHeader 664008 entity.

The Selection 664014 package includes a SupplyPlanningAreaSelectionByLocationIDAndLocationTypeCode 664016 entity.

The SupplyPlanningAreaSelectionByLocationIDAndLocationTypeCode 664016 entity has a cardinality of one 664018 meaning that for each instance of the SupplyPlanningAreaByLocationIDAndLocationTypeCodeQueryMessage 664002 entity there is one SupplyPlanningAreaSelectionByLocationIDAndLocationTypeCode 664016 entity. The SupplyPlanningAreaSelectionByLocationIDAndLocationTypeCode 664016 entity has various subordinate entities, namely SelectionByLocationInternalID 664020 and SelectionByLocationTypeCode 664050.

The SelectionByLocationInternalID 664020 entity has a cardinality of zero or n 664022 meaning that for each instance of the SupplyPlanningAreaSelectionByLocationIDAndLocationTypeCode 664016 entity there may be one or more SelectionByLocationInternalID 664020 entities. The SelectionByLocationInternalID 664020 entity includes various attributes, namely InclusionExclusionCode 664026, IntervalBoundaryTypeCode 664032, LowerBoundaryLocationInternalID 664038 and UpperBoundaryLocationInternalID 664044.

The InclusionExclusionCode 664026 attribute is an InclusionExclusionCode 664030 datatype. The InclusionExclusionCode 664026 attribute has a cardinality of zero or one 664028 meaning that for each instance of the SelectionByLocationInternalID 664020 entity there may be one InclusionExclusionCode 664026 attribute.

The IntervalBoundaryTypeCode 664032 attribute is an IntervalBoundaryTypeCode 664036 datatype. The IntervalBoundaryTypeCode 664032 attribute has a cardinality of one 664034 meaning that for each instance of the SelectionByLocationInternalID 664020 entity there is one IntervalBoundaryTypeCode 664032 attribute.

The LowerBoundaryLocationInternalID 664038 attribute is a LocationInternalID 664042 datatype. The LowerBoundaryLocationInternalID 664038 attribute has a cardinality of zero or one 664040 meaning that for each instance of the SelectionByLocationInternalID 664020 entity there may be one LowerBoundaryLocationInternalID 664038 attribute.

The UpperBoundaryLocationInternalID 664044 attribute is a LocationInternalID 664048 datatype. The UpperBoundaryLocationInternalID 664044 attribute has a cardinality of zero or one 664046 meaning that for each instance of the SelectionByLocationInternalID 664020 entity there may be one UpperBoundaryLocationInternalID 664044 attribute.

The SelectionByLocationTypeCode 664050 entity has a cardinality of zero or n 664052 meaning that for each instance of the SupplyPlanningAreaSelectionByLocationIDAndLocationTypeCode 664016 entity there may be one or more SelectionByLocationTypeCode 664050 entities. The SelectionByLocationTypeCode 664050 entity includes various attributes, namely InclusionExclusionCode 664056, IntervalBoundaryTypeCode 664062, LowerBoundaryLocationTypeCode 664068 and UpperBoundaryLocationTypeCode 664074.

The InclusionExclusionCode 664056 attribute is an InclusionExclusionCode 664060 datatype. The InclusionExclusionCode 664056 attribute has a cardinality of zero or one 664058 meaning that for each instance of the SelectionByLocationTypeCode 664050 entity there may be one InclusionExclusionCode 664056 attribute.

The IntervalBoundaryTypeCode 664062 attribute is an IntervalBoundaryTypeCode 664066 datatype. The IntervalBoundaryTypeCode 664062 attribute has a cardinality of one 664064 meaning that for each instance of the SelectionByLocationTypeCode 664050 entity there is one IntervalBoundaryTypeCode 664062 attribute.

The LowerBoundaryLocationTypeCode 664068 attribute is a LocationTypeCode 664072 datatype. The LowerBoundaryLocationTypeCode 664068 attribute has a cardinality of zero or one 664070 meaning that for each instance of the SelectionByLocationTypeCode 664050 entity there may be one LowerBoundaryLocationTypeCode 664068 attribute.

The UpperBoundaryLocationTypeCode 664074 attribute is a LocationTypeCode 664078 datatype. The UpperBoundaryLocationTypeCode 664074 attribute has a cardinality of zero or one 664076 meaning that for each instance of the SelectionByLocationTypeCode 664050 entity there may be one UpperBoundaryLocationTypeCode 664074 attribute.

MessageHeader Package

A MessageHeader package groups the business information that is relevant for sending a business document in a message.

MessageHeader

A MessageHeader comprises business information from the perspective of the sender application for identifying and processing of a business document (instance) within a (technical) message (if applicable, with a reference to a previous instance of a business document within a previous (technical) message), information about the sender, and any information about the receiver.

Selection Package

The Selection package groups the selection criteria used to query SupplyPlanningAreas.

SupplyPlanningAreaSelectionByLocationIDAndLocationTypeCode

The SupplyPlanningAreaSelectionByLocationIDAndLocationTypeCode specifies search patterns to be used to query SupplyPlanningAreas. SelectionByLocationInternalID is a range of Location identifiers. InclusionExclusionCode is a coded representation of the inclusion of a set into a result set or the exclusion of it. IntervalBoundaryTypeCode is a coded representation of an interval boundary type. LowerBoundaryLocationInternalID is a proprietary identifier for a Location. The LowerBoundaryLocationInternalID is the lower boundary of the Location identifier interval. UpperBoundaryMaterialInternalID is a proprietary identifier for a Location. The UpperBoundaryLocationInternalID is the upper boundary of the Location identifier interval.

SelectionByLocationTypeCode is a range of Location types. LowerBoundaryLocationTypeCode is a coded representation of the type of a Location. The LowerBoundaryLocationTypeCode is the lower boundary of the Location type interval. UpperBoundaryLocationTypeCode is a coded representation of the type of a Location. The UpperBoundaryLocationTypeCode is the upper boundary of the Location type interval.

Message Data Type

The message data type SupplyPlanningAreaByLocationIDAndLocationTypeCodeResponseMessage contains the business information that is relevant for sending a business document in a message, the SupplyPlanningArea in the business document, and the log information with detailed textual messages about the query of SupplyPlanningAreas. The message data type SupplyPlanningAreaByLocationIDAndLocationTypeCodeResponseMessage provides the structure for the message type SupplyPlanningAreaByLocationIDAndLocationTypeCodeResponse and the interfaces based on it. FIGS. 665-1 through 665-2 show a SupplyPlanningAreaByLocationIDAndLocationTypeCode ResponseMessage 6650000 package. The SupplyPlanningAreaByLocationIDAndLocationTypeCodeResponseMessage 6650000 package is a SupplyPlanningAreaByLocationIbAndLocationTypeCode ResponseMessage 6650004 datatype. The SupplyPlanningAreaByLocationIDAndLocationTypeCodeResponseMessage 6650000 package includes a SupplyPlanningAreaByLocationIDAndLocationTypeCodeResponseMessage 6650002 entity. The SupplyPlanningAreaByLocationIDAndLocationTypeCodeResponseMessage 6650000 package includes various packages, namely MessageHeader 6650006, SupplyPlanningArea 6650014 and Log 6650072.

The MessageHeader 6650006 package is a BusinessDocumentMessageHeader 6650012 datatype. The MessageHeader 6650006 package includes a MessageHeader 6650008 entity.

The MessageHeader 6650008 entity has a cardinality of one 6650010 meaning that for each instance of the SupplyPlanningAreaByLocationIDAndLocationTypeCodeResponseMessage 6650002 entity there is one MessageHeader 6650008 entity.

The SupplyPlanningArea 6650014 package includes a SupplyPlanningArea 6650016 entity.

The SupplyPlanningArea 6650016 entity has a cardinality of zero or n 6650018 meaning that for each instance of the SupplyPlanningAreaByLocationIDAndLocationTypeCodeResponseMessage 6650002 entity there may be one or more SupplyPlanningArea 6650016 entities. The SupplyPlanningArea 6650016 entity includes various attributes, namely ID 6650020, StockingProfileCode 6650026 and DestockingProfileCode 6650032. The SupplyPlanningArea 6650016 entity has various subordinate entities, namely Location 6650038 and Property 6650056.

The ID 6650020 attribute is a SupplyPlanningAreaID 6650024 datatype. The ID 6650020 attribute has a cardinality of one 6650022 meaning that for each instance of the SupplyPlanningArea 6650016 entity there is one ID 6650020 attribute.

The StockingProfileCode 6650026 attribute is a StockingProfileCode 6650030 datatype. The StockingProfileCode 6650026 attribute has a cardinality of zero or one 6650028 meaning that for each instance of the SupplyPlanningArea 6650016 entity there may be one StockingProfileCode 6650026 attribute.

The DestockingProfileCode 6650032 attribute is a DestockingProfileCode 6650036 datatype. The DestockingProfileCode 6650032 attribute has a cardinality of zero or one 6650034 meaning that for each instance of the SupplyPlanningArea 6650016 entity there may be one DestockingProfileCode 6650032 attribute.

The Location 6650038 entity has a cardinality of one 6650040 meaning that for each instance of the SupplyPlanningArea 6650016 entity there is one Location 6650038 entity. The Location 6650038 entity includes various attributes, namely InternalID 6650044 and TypeCode 6650050.

The InternalID 6650044 attribute is a LocationInternalID 6650048 datatype. The InternalID 6650044 attribute has a cardinality of one 6650046 meaning that for each instance of the Location 6650038 entity there is one InternalID 6650044 attribute.

The TypeCode 6650050 attribute is a LocationTypeCode 6650054 datatype. The TypeCode 6650050 attribute has a cardinality of one 6650052 meaning that for each instance of the Location 6650038 entity there is one TypeCode 6650050 attribute.

The Property 6650056 entity has a cardinality of zero or n 6650058 meaning that for each instance of the SupplyPlanningArea 6650016 entity there may be one or more Property 6650056 entities. The Property 6650056 entity includes various attributes, namely ID 6650060 and Value 6650066.

The ID 6650060 attribute is a PropertyID 6650064 datatype. The ID 6650060 attribute has a cardinality of one 6650062 meaning that for each instance of the Property 6650056 entity there is one ID 6650060 attribute.

The Value 6650066 attribute is a PropertyValue 6650070 datatype. The Value 6650066 attribute has a cardinality of one 6650068 meaning that for each instance of the Property 6650056 entity there is one Value 6650066 attribute.

The Log 6650072 package is a Log 6650078 datatype. The Log 6650072 package includes a Log 6650074 entity.

The Log 6650074 entity has a cardinality of one 6650076 meaning that for each instance of the SupplyPlanningAreaByLocationIDAndLocationTypeCodeResponseMessage 6650002 entity there is one Log 6650074 entity.

MessageHeader

A MessageHeader comprises business information from the perspective of the sender application for identifying and processing of a business document (instance) within a (technical) message (if applicable, with a reference to a previous instance of a business document within a previous (technical) message), information about the sender, and any information about the receiver.

SupplyPlanningArea Package

The SupplyPlanningArea package groups business information about the requested SupplyPlanningAreas.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. DestockingProfileCode is a coded representation of a destocking profile.

Location

A Location is a geographical place. InternalID is a proprietary identifier for a Location.

TypeCode is a coded representation of the type of a location.

Property

A Property defines a property of a Material. ID is a unique identifier for a property. Value describes a value that can be assigned to a property. For element PropertyID the identifiers 1, 2, 3, 4, and 5 can be supported. For element PropertyValue one language-independent NameSpecification can be supported.

Log Package

The Log package groups the log information sent by Location Data Management.

Log

The entity Log contains the information about the execution of an action.

SupplyPlanningArea Interfaces

Master Data Maintenance is a centralized department that deals with requests from different departments for one of the following functionalities: Create master data object, Change master data object, Deactivate master data object, and Read master data object.

Message Choreography

The message choreographies of FIGS. 653-1 and 653-2 describe possible logical sequences of messages that can be used to realize a supply planning area business scenario.

A SupplyPlanningAreaCreateRequest_sync is a request to create a SupplyPlanningArea in Location Data Management. The structure of the message type SupplyPlanningAreaCreateRequest_sync is specified by the message data type SupplyPlanningAreaCreateRequestMessage_sync.

A SupplyPlanningAreaCreateConfirmation_sync is a confirmation from Location Data Management for the requested creation of a SupplyPlanningArea. The structure of the message type SupplyPlanningAreaCreateConfirmation_sync is specified by the message data type SupplyPlanningAreaCreateConfirmationMessage_sync. A SupplyPlanningAreaChangeRequest_sync is a request to change a SupplyPlanningArea in Location Data Management. The structure of the message type SupplyPlanningAreaChangeRequest_sync is specified by the message data type SupplyPlanningAreaChangeRequestMessage_sync.

A SupplyPlanningAreaChangeConfirmation_sync is a confirmation from Location Data Management for the requested change of a SupplyPlanningArea. The structure of the message type SupplyPlanningAreaChangeConfirmation_sync is specified by the message data type SupplyPlanningAreaChangeConfirmationMessage_sync. A SupplyPlanningAreaDeactivateRequest_sync is a request to deactivate a SupplyPlanningArea in Location Data Management. The structure of the message type SupplyPlanningAreaDeactivateRequest_sync is specified by the message data type SupplyPlanningAreaDeactivateRequestMessage_sync.

A SupplyPlanningAreaDeactivateConfirmation_sync is a confirmation from Location Data Management for the requested deactivation of a SupplyPlanningArea. The structure of the message type SupplyPlanningAreaDeactivateConfirmation_sync is specified by the message data type SupplyPlanningAreaDeactivateConfirmationMessage_sync. A SupplyPlanningAreaByLocationIDQuery_sync is a query submitted to Location Data Management requesting a SupplyPlanningArea. The structure of the message type Supply- PlanningAreaByLocationIDQuery_sync is specified by the message data type SupplyPlanningAreaByLocationIDQueryMessage_sync.

A SupplyPlanningAreaByLocationIDResponse_sync is a response from Location Data Management when it receives a query requesting a SupplyPlanningArea. The structure of the message type SupplyPlanningAreaByLocationIDResponse_sync is specified by the message data type SupplyPlanningAreaByLocationIDResponseMessage_sync.

For example, a "Master Data Maintenance Department" system 653002 can query a supply planning area by location ID and location type using the SupplyPlanningAreaByLocationIDAndLocationTypeCodeQuery asynchronous message 653004 as shown, for example, in FIG. 654. A "Location Data Management" system 653004 can respond to the query using the SupplyPlanningAreaByLocationIDAndLocationTypeCodeResponse asynchronous message 653006 as shown, for example, in FIG. 655. A "Master Data Maintenance Department" system 653010 can request to create a supply planning area using the SupplyPlanningAreaCreateRequest_sync message 653014 as shown, for example, in FIG. 661. A "Location Data Management" system 653012 can confirm the creation request using the SupplyPlanningAreaCreateConfirmation_sync message 653016 as shown, for example, in FIG. 660. The "Master Data Maintenance Department" system 653010 can request to change a supply planning area using the SupplyPlanningAreaChangeRequest_sync message 653018 as shown, for example, in FIG. 659. The "Location Data Management" system 653012 can confirm the change request using the SupplyPlanningAreaChangeConfirmation_sync message 653020 as shown, for example, in FIG. 658. The "Master Data Maintenance Department" system 653010 can request to deactivate a supply planning area using the SupplyPlanningAreaDeactivateRequest_sync message 653022 as shown, for example, in FIG. 663. The "Location Data Management" system 653012 can confirm the deactivation request using the SupplyPlanningAreaDeactivateConfirmation_sync message 653024 as shown, for example, in FIG. 662. The "Master Data Maintenance Department" system 653010 can query a supply planning area by location ID using the SupplyPlanningAreaByLocationIDQuery_sync message 653026 as shown, for example, in FIG. 656. The "Location Data Management" system 653012 can respond to the query using the SupplyPlanningAreaByLocationIDResponse_sync message 653028 as shown, for example, in FIG. 657.

Message Data Type

The message data type SupplyPlanningAreaCreateRequestMessage_sync contains the SupplyPlanningArea included in the business document. The message data type SupplyPlanningAreaCreateRequestMessage_sync, therefore, provides the structure for the message type SupplyPlanningAreaCreateRequest_sync and the interfaces that are based on it. FIG. 671 shows a SupplyPlanningAreaCreateRequestMessage_sync 671000 package. The SupplyPlanningAreaCreateRequestMessage_sync 671000 package is a SupplyPlanningAreaCreateRequestMessage_sync 671004 datatype. The SupplyPlanningAreaCreateRequestMessage_sync 671000 package includes a SupplyPlanningAreaCreateRequestMessage_sync 671002 entity. The SupplyPlanningAreaCreateRequestMessage_sync 671000 package includes a SupplyPlanningArea 671006 package.

The SupplyPlanningArea 671006 package includes a SupplyPlanningArea 671008 entity. The SupplyPlanningArea 671008 entity has a cardinality of one 671010 meaning that for each instance of the SupplyPlanningAreaCreateRequestMessage_sync 671002 entity there is one SupplyPlanningArea 671008 entity. The SupplyPlanningArea 671008 entity includes various attributes, namely ID 671012, StockingProfileCode 671018 and DestockingProfileCode 671024. The SupplyPlanningArea 671008 entity has various subordinate entities, namely Location 671030 and Property 671048.

The ID 671012 attribute is a SupplyPlanningAreaID 671016 datatype. The ID 671012 attribute has a cardinality of one 671014 meaning that for each instance of the SupplyPlanningArea 671008 entity there is one ID 671012 attribute.

The StockingProfileCode 671018 attribute is a StockingProfileCode 671022 datatype. The StockingProfileCode 671018 attribute has a cardinality of zero or one 671020 meaning that for each instance of the SupplyPlanningArea 671008 entity there may be one StockingProfileCode 671018 attribute.

The DestockingProfileCode 671024 attribute is a DestockingProfileCode 671028 datatype. The DestockingProfileCode 671024 attribute has a cardinality of zero or one 671026 meaning that for each instance of the SupplyPlanningArea 671008 entity there may be one DestockingProfileCode 671024 attribute.

The Location 671030 entity has a cardinality of one 671032 meaning that for each instance of the SupplyPlanningArea 671008 entity there is one Location 671030 entity. The Location 671030 entity includes various attributes, namely InternalID 671036 and TypeCode 671042.

The InternalID 671036 attribute is a LocationInternalID 671040 datatype. The InternalID 671036 attribute has a cardinality of one 671038 meaning that for each instance of the Location 671030 entity there is one InternalID 671036 attribute.

The TypeCode 671042 attribute is a LocationTypeCode 671046 datatype. The TypeCode 671042 attribute has a cardinality of zero or one 671044 meaning that for each instance of the Location 671030 entity there may be one TypeCode 671042 attribute.

The Property 671048 entity has a cardinality of zero or n 671050 meaning that for each instance of the SupplyPlanningArea 671008 entity there may be one or more Property 671048 entities. The Property 671048 entity includes various attributes, namely ID 671052 and Value 671058.

The ID 671052 attribute is a PropertyID 671056 datatype. The ID 671052 attribute has a cardinality of one 671054 meaning that for each instance of the Property 671048 entity there is one ID 671052 attribute.

The Value 671058 attribute is a PropertyValue 671062 datatype. The Value 671058 attribute has a cardinality of one 671060 meaning that for each instance of the Property 671048 entity there is one Value 671058 attribute.

SupplyPlanningArea Package

The SupplyPlanningArea package groups business information relevant to creating a SupplyPlanningArea.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. DestockingProfileCode is a coded representation of a destocking profile. For the element ID the same identifier has to be used as for the element InternalID of the entity Location.

Location

A Location is a geographical place. InternalID is a proprietary identifier for a Location.

TypeCode is a coded representation of the type of a Location. If an external identifier is passed on in the element InternalID also the element TypeCode can be mandatory.

Property

A Property defines a property of a Material. ID is a unique identifier for a property. Value describes a value that can be assigned to a property. For element PropertyID the identifiers 1, 2, 3, 4, and 5 can be supported. For element PropertyValue one language-independent NameSpecification can be supported.

Message Data Type

The message data type SupplyPlanningAreaCreateConfirmationMessage_sync contains the SupplyPlanningArea in the business document. It includes the log information with detailed textual messages about the creation of a SupplyPlanningArea. The message data type SupplyPlanningAreaCreateConfirmationMessage_sync provides the structure for the message type SupplyPlanningAreaCreateConfirmation_sync and the interfaces based on it. FIG. 670 shows a SupplyPlanningAreaCreateConfirmationMessage_sync 670000 package. The SupplyPlanningAreaCreateConfirmationMessage_sync 670000 package is a SupplyPlanningAreaCreateConfirmationMessage_sync 670004 datatype. The SupplyPlanningAreaCreateConfirmationMessage_sync 670000 package includes a SupplyPlanningAreaCreateConfirmationMessage_sync 670002 entity. The SupplyPlanningAreaCreateConfirmationMessage__sync 670000 package includes various packages, namely SupplyPlanningArea 670006 and Log 670018.

The SupplyPlanningArea 670006 package includes a SupplyPlanningArea 670008 entity.

The SupplyPlanningArea 670008 entity has a cardinality of zero or one 670010 meaning that for each instance of the SupplyPlanningAreaCreateConfirmationMessage_sync 670002 entity there may be one SupplyPlanningArea 670008 entity. The SupplyPlanningArea 670008 entity includes an ID 670012 attribute.

The ID 670012 attribute is a SupplyPlanningAreaID 670016 datatype. The ID 670012 attribute has a cardinality of one 670014 meaning that for each instance of the SupplyPlanningArea 670008 entity there is one ID 670012 attribute.

The Log 670018 package is a Log 670024 datatype. The Log 670018 package includes a Log 670020 entity.

The Log 670020 entity has a cardinality of one 670022 meaning that for each instance of the SupplyPlanningAreaCreateConfirmationMessage_sync 670002 entity there is one Log 670020 entity.

SupplyPlanningArea Package

The SupplyPlanningArea package groups information about the SupplyPlanningArea created.

SupplyPlanningArea

A SupplyPlanningArea is an area in which planning is executed separately to guarantee the availability of Materials on time. An ID is a unique identifier for a SupplyPlanningArea.

Log Package

The Log package groups the log information sent by Location Data Management.

Log

The entity Log contains the information about the execution of an action.

Message Data Type

The message data type SupplyPlanningAreaChangeRequestMessage_sync contains the SupplyPlanningArea included in the business document. The message data type SupplyPlanningAreaChangeRequestMessage_sync, therefore, provides the structure for the message type SupplyPlanningAreaChangeRequest_sync and the interfaces that are based on it. FIGS. 669-1 through 669-2 show a SupplyPlanningAreaChangeRequestMessage_sync 669000 package. The SupplyPlanningAreaChangeRequestMessage_sync 669000 package is a SupplyPlanningAreaChangeRequestMessage_sync 669004 datatype. The SupplyPlanningAreaChangeRequestMessage_sync 669000 package includes a SupplyPlanningAreaChangeRequestMessage_sync 669002 entity. The SupplyPlanningAreaChangeRequestMessage_sync 669000 package includes a SupplyPlanningArea 669006 package.

The SupplyPlanningArea 669006 package includes a SupplyPlanningArea 669008 entity.

The SupplyPlanningArea 669008 entity has a cardinality of one 669010 meaning that for each instance of the SupplyPlanningAreaChangeRequestMessage_sync 669002 entity there is one SupplyPlanningArea 669008 entity. The SupplyPlanningArea 669008 entity includes various attributes, namely ID 669012, StockingProfileCode 669018 and DestockingProfileCode 669024. The SupplyPlanningArea 669008 entity includes a Property 669030 subordinate entity.

The ID 669012 attribute is a SupplyPlanningAreaID 669016 datatype. The ID 669012 attribute has a cardinality of one 669014 meaning that for each instance of the SupplyPlanningArea 669008 entity there is one ID 669012 attribute.

The StockingProfileCode 669018 attribute is a StockingProfileCode 669022 datatype. The StockingProfileCode 669018 attribute has a cardinality of zero or one 669020 meaning that for each instance of the SupplyPlanningArea 669008 entity there may be one StockingProfileCode 669018 attribute.

The DestockingProfileCode 669024 attribute is a DestockingProfileCode 669028 datatype. The DestockingProfileCode 669024 attribute has a cardinality of zero or one 669026 meaning that for each instance of the SupplyPlanningArea 669008 entity there may be one DestockingProfileCode 669024 attribute.

The Property 669030 entity has a cardinality of zero or n 669032 meaning that for each instance of the SupplyPlanningArea 669008 entity there may be one or more Property 669030 entities. The Property 669030 entity includes various attributes, namely ID 669034 and Value 669040.

The ID 669034 attribute is a PropertyID 669038 datatype. The ID 669034 attribute has a cardinality of one 669036 meaning that for each instance of the Property 669030 entity there is one ID 669034 attribute.

The Value 669040 attribute is a PropertyValue 669044 datatype. The Value 669040 attribute has a cardinality of one 669042 meaning that for each instance of the Property 669030 entity there is one Value 669040 attribute.

SupplyPlanningArea Package

The SupplyPlanningArea package groups business information relevant to changing a SupplyPlanningArea.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. DestockingProfileCode is a coded representation of a destocking profile.

Property

A Property defines a property of a Material. ID is a unique identifier for a property. Value describes a value that can be assigned to a property. For element PropertyID the identifiers 1, 2, 3, 4, and 5 can be supported. For element PropertyValue one language-independent NameSpecification can be supported.

Message Data Type

The message data type SupplyPlanningAreaChangeConfirmationMessage_sync contains the SupplyPlanningArea in the business document and the log information with detailed textual messages about the change of a SupplyPlanningArea. The message data type SupplyPlanningAreaChangeConfirmationMessage_sync provides the structure for the message type SupplyPlanningAreaChangeConfirmation_sync and the interfaces based on it. FIG. 668 shows a SupplyPlanningAreaChangeConfirmationMessage_sync 668000 package. The SupplyPlanningAreaChangeConfirmationMessage_sync 668000 package is a SupplyPlanningAreaChangeConfirmationMessage_sync 668004 datatype. The SupplyPlanningAreaChangeConfirmationMessage_sync 668000 package includes a SupplyPlanningAreaChangeConfirmationMessage_sync 668002 entity. The SupplyPlanningAreaChangeConfirmationMessage_sync 668000 package includes various packages, namely SupplyPlanningArea 668006 and Log 668018.

The SupplyPlanningArea 668006 package includes a SupplyPlanningArea 668008 entity.

The SupplyPlanningArea 668008 entity has a cardinality of zero or one 668010 meaning that for each instance of the SupplyPlanningAreaChangeConfirmationMessage_sync 668002 entity there may be one SupplyPlanningArea 668008 entity. The SupplyPlanningArea 668008 entity includes an ID 668012 attribute.

The ID 668012 attribute is a SupplyPlanningAreaID 668016 datatype. The ID 668012 attribute has a cardinality of one 668014 meaning that for each instance of the SupplyPlanningArea 668008 entity there is one ID 668012 attribute.

The Log 668018 package is a Log 668024 datatype. The Log 668018 package includes a Log 668020 entity.

The Log 668020 entity has a cardinality of one 668022 meaning that for each instance of the SupplyPlanningAreaChangeConfirmationMessage_sync 668002 entity there is one Log 668020 entity.

SupplyPlanningArea Package

The SupplyPlanningArea package groups information about the SupplyPlanningArea changed.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. DestockingProfileCode is a coded representation of a destocking profile.

Log Package

The Log package groups the log information sent by Location Data Management.

Log

The entity Log contains the information about the execution of an action.

Message Data Type

The message data type SupplyPlanningAreaDeactivateRequestMessage_sync contains the SupplyPlanningArea included in the business document. The message data type SupplyPlanningAreaDeactivateRequestMessage_sync, therefore, provides the structure for the message type SupplyPlanningAreaDeactivateRequest_sync and the interfaces that are based on it.

SupplyPlanningArea Package

The SupplyPlanningArea package groups business information relevant to deactivating a SupplyPlanningArea.

SupplyPlanningArea

A SupplyPlanningArea is an area in which planning is executed separately to guarantee the availability of Materials on time. ID is a unique identifier for a SupplyPlanningArea.

StockingProfileCode is a coded representation of a stocking profile. DestockingProfileCode is a coded representation of a destocking profile.

Message Data Type

The message data type SupplyPlanningAreaDeactivateConfirmationMessage_sync contains the SupplyPlanningArea in the business document and the log information with detailed textual messages about the deactivation of a SupplyPlanningArea. The message data type SupplyPlanningAreaDeactivateConfirmationMessage_sync provides the structure for the message type SupplyPlanningAreaDeactivateConfirmation_sync and the interfaces based on it. FIG. 672 shows a SupplyPlanningAreaDeactivateConfirmationMessage_sync 672000 package. The SupplyPlanningAreaDeactivateConfirmationMessage_sync 672000 package is a SupplyPlanningAreaDeactivateConfirmationMessage_sync 672004 datatype. The SupplyPlanningAreaDeactivateConfirmationMessage_sync 672000 package includes a SupplyPlanningAreaDeactivateConfirmationMessage_sync 672002 entity. The SupplyPlanningAreaDeactivateConfirmationMessage_sync 672000 package includes various packages, namely SupplyPlanningArea 672006 and Log 672018.

The SupplyPlanningArea 672006 package includes a SupplyPlanningArea 672008 entity.

The SupplyPlanningArea 672008 entity has a cardinality of zero or one 672010 meaning that for each instance of the SupplyPlanningAreaDeactivateConfirmationMessage_sync 672002 entity there may be one SupplyPlanningArea 672008 entity. The SupplyPlanningArea 672008 entity includes an ID 672012 attribute.

The ID 672012 attribute is a SupplyPlanningAreaID 672016 datatype. The ID 672012 attribute has a cardinality of one 672014 meaning that for each instance of the SupplyPlanningArea 672008 entity there is one ID 672012 attribute.

The Log 672018 package is a Log 672024 datatype. The Log 672018 package includes a Log 672020 entity.

The Log 672020 entity has a cardinality of one 672022 meaning that for each instance of the SupplyPlanningAreaDeactivateConfirmationMessage_sync 672002 entity there is one Log 672020 entity.

SupplyPlanningArea Package

The SupplyPlanningArea package groups information about the SupplyPlanningArea deactivated.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. DestockingProfileCode is a coded representation of a destocking profile.

Log Package

The Log package groups the log information sent by Location Data Management.

Log

The entity Log contains the information about the execution of an action.

Message Data Type

The message data type SupplyPlanningAreaByLocationIDQueryMessage_sync contains the Selection in the business document. The message data type SupplyPlanningAreaByLocationIDQueryMessage_sync provides the structure for the message type SupplyPlanningAreaByLocationIDQuery_sync and the interfaces based on it. FIG. 666 shows a SupplyPlanningAreaByLocationIDQueryMessage_sync 666000 package. The SupplyPlanningAreaByLocation- IDQueryMessage_sync 666000 package is a SupplyPlanningAreaByLocationIDQueryMessage_sync 666004 datatype. The SupplyPlanningAreaByLocationIDQueryMessage_sync 666000 package includes a SupplyPlanningAreaByLocationIDQueryMessage_sync 666002 entity. The SupplyPlanningAreaByLocationIDQueryMessage_sync 666000 package includes a Selection 666006 package.

The Selection 666006 package includes a SupplyPlanningAreaSelectionByLocationID 666008 entity.

The SupplyPlanningAreaSelectionByLocationID 666008 entity has a cardinality of one 666010 meaning that for each instance of the SupplyPlanningAreaByLocationIDQueryMessage_sync 666002 entity there is one SupplyPlanningAreaSelectionByLocationID 666008 entity. The SupplyPlanningAreaSelectionByLocationID 666008 entity includes various attributes, namely LocationInternalID 666012 and LocationTypeCode 666018.

The LocationInternalID 666012 attribute is a LocationInternalID 666016 datatype. The LocationInternalID 666012 attribute has a cardinality of one 666014 meaning that for each instance of the SupplyPlanningAreaSelectionByLocationID 666008 entity there is one LocationInternalID 666012 attribute.

The LocationTypeCode 666018 attribute is a LocationTypeCode 666022 datatype. The LocationTypeCode 666018 attribute has a cardinality of zero or one 666020 meaning that for each instance of the SupplyPlanningAreaSelectionByLocationID 666008 entity there may be one LocationTypeCode 666018 attribute.

Selection Package

The Selection package groups the selection criteria used to query SupplyPlanningAreas.

SupplyPlanningAreaSelectionByLocationID

SupplyPlanningAreaSelectionByLocationID is a selection used to query SupplyPlanningAreas. LocationInternalID is a proprietary identifier for a Location. LocationTypeCode is a coded representation of the type of a location. If an external identifier is passed on in the element LocationInternalID also the element LocationTypeCode can be mandatory.

Message Data Type

The message data type SupplyPlanningAreaByLocationIDResponseMessage_sync contains the SupplyPlanningArea in the business document and the log information with detailed textual messages about the query of a SupplyPlanningArea. The message data type SupplyPlanningAreaByLocationIDResponseMessage_sync provides the structure for the message type SupplyPlanningAreaByLocationIDResponse_sync and the interfaces based on it. FIGS. 667-1 through 667-3 show a SupplyPlanningAreaByLocationIDResponseMessage_sync 667000 package. The SupplyPlanningAreaByLocationIDResponseMessage_sync 667000 package is a SupplyPlanningAreaByLocationIDResponseMessage_sync 667004 datatype. The SupplyPlanningAreaByLocationIDResponseMessage_sync 667000 package includes a SupplyPlanningAreaByLocationIDResponseMessage_sync 667002 entity. The SupplyPlanningAreaByLocationIDResponseMessage_sync 667000 package includes various packages, namely SupplyPlanningArea 667006 and Log 667082.

The SupplyPlanningArea 667006 package includes a SupplyPlanningArea 667008 entity.

The SupplyPlanningArea 667008 entity has a cardinality of zero or one 667010 meaning that for each instance of the SupplyPlanningAreaByLocationIDResponseMessage_sync 667002 entity there may be one SupplyPlanningArea 667008 entity. The SupplyPlanningArea 667008 entity includes various attributes, namely ID 667012, StockingProfileCode 667018, StockingProfileName 667024, DestockingProfileCode 667030 and DestockingProfileName 667036. The SupplyPlanningArea 667008 entity has various subordinate entities, namely Location 667042 and Property 667066.

The ID 667012 attribute is a SupplyPlanningAreaID 667016 datatype. The ID 667012 attribute has a cardinality of one 667014 meaning that for each instance of the SupplyPlanningArea 667008 entity there is one ID 667012 attribute.

The StockingProfileCode 667018 attribute is a StockingProfileCode 667022 datatype. The StockingProfileCode 667018 attribute has a cardinality of zero or one 667020 meaning that for each instance of the SupplyPlanningArea 667008 entity there may be one StockingProfileCode 667018 attribute.

The StockingProfileName 667024 attribute is a LEN40_Name 667028 datatype. The StockingProfileName 667024 attribute has a cardinality of zero or one 667026 meaning that for each instance of the SupplyPlanningArea 667008 entity there may be one StockingProfileName 667024 attribute.

The DestockingProfileCode 667030 attribute is a DestockingProfileCode 667034 datatype. The DestockingProfileCode 667030 attribute has a cardinality of zero or one 667032 meaning that for each instance of the SupplyPlanningArea 667008 entity there may be one DestockingProfileCode 667030 attribute.

The DestockingProfileName 667036 attribute is a LEN40_Name 667040 datatype. The DestockingProfileName 667036 attribute has a cardinality of zero or one 667038 meaning that for each instance of the SupplyPlanningArea 667008 entity there may be one DestockingProfileName 667036 attribute.

The Location 667042 entity has a cardinality of one 667044 meaning that for each instance of the SupplyPlanningArea 667008 entity there is one Location 667042 entity. The Location 667042 entity includes various attributes, namely InternalID 667048, TypeCode 667054 and TypeName 667060.

The InternalID 667048 attribute is a LocationInternalID 667052 datatype. The InternalID 667048 attribute has a cardinality of one 667050 meaning that for each instance of the Location 667042 entity there is one InternalID 667048 attribute.

The TypeCode 667054 attribute is a LocationTypeCode 667058 datatype. The TypeCode 667054 attribute has a cardinality of one 667056 meaning that for each instance of the Location 667042 entity there is one TypeCode 667054 attribute.

The TypeName 667060 attribute is a LEN60_Name 667064 datatype. The TypeName 667060 attribute has a cardinality of one 667062 meaning that for each instance of the Location 667042 entity there is one TypeName 667060 attribute.

The Property 667066 entity has a cardinality of zero or n 667068 meaning that for each instance of the SupplyPlanningArea 667008 entity there may be one or more Property 667066 entities. The Property 667066 entity includes various attributes, namely ID 667070 and Value 667076.

The ID 667070 attribute is a PropertyID 667074 datatype. The ID 667070 attribute has a cardinality of one 667072 meaning that for each instance of the Property 667066 entity there is one ID 667070 attribute.

The Value 667076 attribute is a PropertyValue 667080 datatype. The Value 667076 attribute has a cardinality of one 667078 meaning that for each instance of the Property 667066 entity there is one Value 667076 attribute.

The Log 667082 package is a Log 667088 datatype. The Log 667082 package includes a Log 667084 entity.

The Log 667084 entity has a cardinality of one 667086 meaning that for each instance of the SupplyPlanningAreaByLocationIDResponseMessage_sync 667002 entity there is one Log 667084 entity.

SupplyPlanningArea Package

The SupplyPlanningArea package groups business information relevant for a SupplyPlanningArea.

SupplyPlanningArea

A SupplyPlanningArea is an area in which planning is executed separately to guarantee the availability of Materials on time. ID is a unique identifier for a SupplyPlanningArea. StockingProfileCode is a coded representation of a stocking profile. StockingProfileName is a representation of the StockingProfileCode in natural language. DestockingProfileCode is a coded representation of a destocking profile. DesctockingProfileName is a representation of the DestockingProfileCode in natural language.

Location

A Location is a geographical place. InternalID is a proprietary identifier for a Location. TypeCode is a coded representation of the type of a location. TypeName is a representation of the LocationTypeCode in natural language.

Property

A Property defines a property of a Material. ID is a unique identifier for a property. Value describes a value that can be assigned to a property. For element PropertyID the identifiers 1, 2, 3, 4, and 5 can be supported. For element PropertyValue one language-independent NameSpecification can be supported.

Log Package

The Log package groups the log information sent by Location Data Management.

Log

The entity Log contains the information about the execution of an action.

TradeItemCatalogue Interfaces

TradeItemCatalogue is used to exchange data about available products between vendors and retailers through Recipient Data Pool. It can contain item (e.g. unit of measure, description) or item price information. Our business scenario concentrates on Recipient Data Pool and Retailer (Data recipient), and their interactions.

Message Choreography

The message choreography of FIG. 674-1 describes a possible logical sequence of messages that can be used to realize a subscription and initial transmission process of a trade item catalog business scenario.

A TradeItemCatalogueSubscriptionRequest is a request from TradeItemCatalogueAuthoring sent to a Recipient Data Pool for a subscription. The structure of the message type TradeItemCatalogueSubscriptionRequest is specified by the message data type TradeItemCatalogue.

A TradeItemCatalogueSubscriptionCancelRequest is a request from TradeItemCatalogueAuthoring to cancel a subscription. The structure of the message type TradeItemCatalogueSubscriptionCancelRequest is specified by the message data type TradeItemCatalogue.

A TradeItemCatalogueSubscriptionConfirmation is the confirmation to TradeItemCatalogueAuthoring of a TradeItemCatalogueSubscriptionRequest or TradeItemCatalogueSubscriptionCancelRequest by the Recipient Data Pool. The structure of the message type TradeItemCatalogueSubscriptionConfirmation is specified by the message data type TradeItemCatalogue.

A TradeItemCatalogueAcceptanceNotification is the notification from TradeItemCataloguePublishing of the acceptance of TradeItemCatalogue. The structure of the message type TradeItemCatalogueAcceptanceNotification is specified by the message data type TradeItemCatalogue.

A TradeItemCatalogueTransmissionRequestRequest is a request from TradeItemCatalogueAuthoring for a TradeItemCatalogueTransmissionRequest. The structure of the message type TradeItemCatalogueTransmissionRequestRequest is specified by the message data type TradeItemCatalogue.

A TradeItemCatalogueTransmissionRequest is a request for the creation of TradeItemCatalogue to TradeItemCatalogueAuthoring by the recipient Data Pool. The structure of the message type TradeItemCatalogueTransmissionRequest is specified by the message data type TradeItemCatalogue.

A TradeItemCatalogueTransmissionConfirmation is a confirmation from TradeItemCatalogueAuthoring of the correct transmission of requested TradeItemCatalogues. The structure of the message type TradeItemCatalogueTransmissionConfirmation is specified by the message data type TradeItemCatalogue.

For example, a "Trade Item Catalogue Publishing" system 674002 can request a trade item catalog subscription using the TradeItemCatalogueSubscriptionRequest message 674006. A "Recipient Data Pool" system 674004 can confirm the request using the TradeItemCatalogueSubscriptionConfirmation message 674008. The "Trade Item Catalogue Publishing" system 674002 can request a trade item catalog transmission using the TradeItemCatalogueTransmissionRequest message 674010. The "Recipient Data Pool" system 674004 can confirm the request using the TradeItemCatalogueTransmissionConfirmation message 674012.

The message choreography of FIG. 674-2 describes a possible logical sequence of messages that can be used to realize a confirmation process of a trade item catalog business scenario. A "Trade Item Catalogue Publishing" system 674014 can notify a "Recipient Data Pool" system 674016 of a trade item catalog acceptance using the TradeItemCatalogueAcceptanceNotification message 674018.

The message choreography of FIG. 674-3 describes a possible logical sequence of messages that can be used to realize a transmission process of a trade item catalog business scenario. A "Trade Item Catalogue Publishing" system 674020 can request a trade item catalog transmission request using the TradeItemCatalogueTransmissionRequestRequest message 674024. A "Recipient Data Pool" system 674022 can confirm the request using the TradeItemCatalogueTransmissionConfirmation message 674026. The "Trade Item Catalogue Publishing" system 674020 can request to transmit a trade item catalog using the TradeItemCatalogueTransmissionRequest message 674028. The "Recipient Data Pool" system 674022 can confirm the request using the TradeItemCatalogueTransmissionConfirmation message 674030.

The message choreography of FIG. 674-4 describes a possible logical sequence of messages that can be used to realize a cancellation process of a trade item catalog business scenario. A "Trade Item Catalogue Publishing" system 674032 can request to cancel a trade item catalog subscription using the TradeItemCatalogueSubscriptionCancelRequest message 674036. A "Recipient Data Pool" system 674034 can confirm the request using the TradeItemCatalogueSubscriptionConfirmation message 674038.

Message Data Type

The message data type TradeItemCatalogueTemplateMessage groups together the business information that is relevant for sending a business document in a message, the TradeItemCatalogue object in the business document, and Log information.

The message data type TradeItemCatalogueMessage is used in following message types: TradeItemCatalogueSubscriptionRequest, TradeItemCatalogueSubscriptionCancelRequest, TradeItemCatalogueSubscriptionConfirmation, TradeItemCatalogueAcceptanceNotification, TradeItemCatalogueTransmissionRequestRequest, TradeItemCatalogueTransmissionRequest, and TradeItemCatalogueTransmissionConfirmation.

FIGS. 675-1 through 675-4 show a TradeItemCatalogueTemplate 675000 package. The TradeItemCatalogueTemplate 675000 package is a TradeItemCatalogueTemplate 675004 datatype. The TradeItemCatalogueTemplate 675000 package includes a TradeItemCatalogueTemplate 675002 entity. The TradeItemCatalogueTemplate 675000 package includes various packages, namely MessageHeader 675006, TradeItemCatalogue 675014 and Log 6750112.

The MessageHeader 675006 package is a BusinessDocumentMessageHeader 675012 datatype. The MessageHeader 675006 package includes a MessageHeader 675008 entity.

The MessageHeader 675008 entity has a cardinality of one 675010 meaning that for each instance of the TradeItemCatalogueTemplate 675002 entity there is one MessageHeader 675008 entity.

The TradeItemCatalogue 675014 package includes a TradeItemCatalogue 675016 entity. The TradeItemCatalogue 675014 package includes various packages, namely Party 675056 and Item 675082.

The TradeItemCatalogue 675016 entity has a cardinality of one or n 675018 meaning that for each instance of the TradeItemCatalogueTemplate 675002 entity there are one or more TradeItemCatalogue 675016 entities. The TradeItemCatalogue 675016 entity includes various attributes, namely @actionCode 675020, CreationDateTime 675026, LastUpdateDate 675032, CatalogueID 675038, ContentVersionID 675044 and DocumentStructureVersionID 675050.

The @actionCode 675020 attribute is an ActionCode 675024 datatype. The @actionCode 675020 attribute has a cardinality of one 675022 meaning that for each instance of the TradeItemCatalogue 675016 entity there is one @actionCode 675020 attribute.

The CreationDateTime 675026 attribute is a GLOBAL_DateTime 675030 datatype. The CreationDateTime 675026 attribute has a cardinality of one 675028 meaning that for each instance of the TradeItemCatalogue 675016 entity there is one CreationDateTime 675026 attribute.

The LastUpdateDate 675032 attribute is a Date 675036 datatype. The LastUpdateDate 675032 attribute has a cardinality of zero or one 675034 meaning that for each instance of the TradeItemCatalogue 675016 entity there may be one LastUpdateDate 675032 attribute.

The CatalogueID 675038 attribute is a CatalogueID 675042 datatype. The CatalogueID 675038 attribute has a cardinality of one 675040 meaning that for each instance of the TradeItemCatalogue 675016 entity there is one CatalogueID 675038 attribute.

The ContentVersionID 675044 attribute is a VersionID 675048 datatype. The ContentVersionID 675044 attribute has a cardinality of zero or one 675046 meaning that for each instance of the TradeItemCatalogue 675016 entity there may be one ContentVersionID 675044 attribute.

The DocumentStructureVersionID 675050 attribute is a VersionID 675054 datatype. The DocumentStructureVersionID 675050 attribute has a cardinality of zero or one 675052 meaning that for each instance of the TradeItemCatalogue 675016 entity there may be one DocumentStructureVersionID 675050 attribute.

The Party 675056 package is a BusinessTransactionDocumentParty 675062 datatype. The Party 675056 package includes various entities, namely RecipientParty 675058, SourceParty 675064, DataCreatorParty 675070 and ContentOwnerParty 675076.

The RecipientParty 675058 entity has a cardinality of one 675060 meaning that for each instance of the TradeItemCatalogue 675016 entity there is one RecipientParty 675058 entity.

The SourceParty 675064 entity has a cardinality of one 675066 meaning that for each instance of the TradeItemCatalogue 675016 entity there is one SourceParty 675064 entity.

The DataCreatorParty 675070 entity has a cardinality of one 675072 meaning that for each instance of the TradeItemCatalogue 675016 entity there is one DataCreatorParty 675070 entity.

The ContentOwnerParty 675076 entity has a cardinality of one 675078 meaning that for each instance of the TradeItemCatalogue 675016 entity there is one ContentOwnerParty 675076 entity.

The Item 675082 package includes an Item 675084 entity.

The Item 675084 entity has a cardinality of zero or n 675086 meaning that for each instance of the TradeItemCatalogue 675016 entity there may be one or more Item 675084 entities. The Item 675084 entity includes various attributes, namely @actionCode 675088 and @propertyValuationList. The Item 675084 entity has various subordinate entities, namely CompleteTransmissionIndicator 675094, CatalogueItemID 6750100 and PropertyValuation 6750106.

The @actionCode 675088 attribute is an ActionCode 675092 datatype. The @actionCode 675088 attribute has a cardinality of zero or one 675090 meaning that for each instance of the Item 675084 entity there may be one @actionCode 675088 attribute.

The @propertyValuationList attribute is a CompleteTransmissionIndicator 675098 datatype. The @propertyValuationList attribute has a cardinality of zero or one 675096 meaning that for each instance of the Item 675084 entity there may be one @propertyValuationList attribute.

The CatalogueItemID 6750100 entity has a cardinality of one 6750102 meaning that for each instance of the Item 675084 entity there is one CatalogueItemID 6750100 entity.

The PropertyValuation 6750106 entity has a cardinality of zero or n 6750108 meaning that for each instance of the Item 675084 entity there may be one or more PropertyValuation 6750106 entities.

The Log 6750112 package is a Log 6750118 datatype. The Log 6750112 package includes a Log 6750114 entity.

The Log 6750114 entity has a cardinality of one 6750116 meaning that for each instance of the TradeItemCatalogueTemplate 675002 entity there is one Log 6750114 entity.

MessageHeader Package

A MessageHeader package groups the business information that is relevant for sending a business document in a message.

MessageHeader

A MessageHeader groups the following business information from the perspective of the sending application: information to identify the business document in a message, information about the sender, and (possibly) information about the recipient.

SenderParty

A SenderParty is the party responsible for sending a business document at business application level.

RecipientParty

A RecipientParty is the party responsible for receiving a business document at business application level. The RecipientParty reuses type GDT BusinessDocumentMessageHeaderParty.

TradeItemCatalogue Package

TradeItemCatalogue package groups the TradeItemCatalogue together along with its packages.

TradeItemCatalogue

A TradeItemCatalogue groups together the header information of the TradeItemCatalogue. ActionCode is a coded representation of an instruction to the recipient of TradeItemCatalogue telling it how to process a transmitted TradeItemCatalogue.

CreationDateTime is the accurate-to-the-second timepoint of a calendar day in timezone UTC when the TradeItemCatalogue was created. LastUpdateDate is the specification of the exact day in the Gregorian calendar when the TradeItemCatalogue was updated the last time. A CatalogueID is a unique identifier for a catalog. A catalog is a systematically arranged directory of objects of a particular type that are identified uniquely within the catalog. ContentVersionID is a unique identifier for the current version of the content of the TradeItemCatalogue DocumentStructureVersionID is a unique identifier for the version of the structure of the TradeItemCatalogue.

Party Package

Party package groups the parties that are interested in the TradeItemCatalogue with its packages:

DataPoolParty

A DataPoolParty is a party that received/sent the TradeItemCatalogue. A RecipientParty is a party to whom the TradeItemCatalogue is sent. The party is a retailer.

SourceParty

A SourceParty is a party who send the TradeItemCatalogue. The SourceParty is of type GDT: BusinessTransactionDocumentParty.

DataCreatorParty

A DataCreatorParty is a party that has created the TradeItemCatalogue. This can be the same party as the ContentOwner or it can be a different one.

ContentOwnerParty

A ContentOwnerParty is a party to whom the TradeItemCatalogue belongs. The party also the one that make it available for the DataRecipient.

Item Package

Item package groups various information about one item of the TradeItemCatalogue.

Item

An Item specifies information about one product included in the TradeItemCatalogue.

ActionCode is a coded representation of an instruction to the recipient of Item telling it how to process it. DescriptionListCompleteTransmissionIndicator indicates whether the list of Descriptions is transmitted completely or not. ClassificationListCompleteTransmissionIndicator indicates whether the list of Classifications is transmitted completely or not.

PropertyValuationListCompleteTransmissionIndicator indicates whether the list of PropertyValuations is transmitted completely or not. CatalogueItemID is an identifier for the item Description A Description provides a description for an item in various locales (languages).

Classification

A Classification classifies an item by assigning it to a Section within one of the catalog's schemas which the item belongs to. CatalogueSchemaID identifies the schema that the item references. CatalogueSectionID identifies the Section that the item references.

PropertyValuation

A PropertyValuation specifies the value of a property that can be attributed to the object the item represents, according to one of the catalog schemas.

PriceSpecificationElement

A PriceSpecificationElement is the specification of price, discount, surcharge, tax that is valid for a specific period of time and a specific party PriceInformation Package PriceInformation package groups price information for one or a group of items of the TradeItemCatalogue or specific to a party.

PriceInformation

A PriceInformation is information about price, discount, surcharge or tax that is valid for a specific period of time and one or a group of items. ActionCode is a coded representation of an instruction to the recipient of PriceInformation telling it how to process it.

Log Package

A Log package groups the error messages used for user interaction

Log

A Log is a sequence of messages that result when an application executes a task.

Message Data Type

The message data type TradeItemCatalogueSubscriptionCancelRequest is derived from the message data type TradeItemCatalogueTemplateMessage The structure is identical to TradeItemCatalogueTemplateMessage.

Message Data Type

The message data type TradeItemCatalogueSubscriptionConfirmation is derived from the message data type TradeItemCatalogueTemplateMessage. The structure is identical to TradeItemCatalogueTemplateMessage.

Message Data Type

The message data type TradeItemCatalogueAcceptanceNotification is derived from the message data type TradeItemCatalogueTemplateMessage. The structure is identical to TradeItemCatalogueTemplateMessage.

Message Data Type

The message data type TradeItemCatalogueTransmissionRequestRequest is derived from the message data type TradeItemCatalogueTemplateMessage. The structure is identical to TradeItemCatalogueTemplateMessage.

Message Data Type

The message data type TradeItemCatalogueTransmissionRequest is derived from the message data type TradeItemCatalogueTemplateMessage. The structure is identical to TradeItemCatalogueTemplateMessage.

Message Data Type

The message data type TradeItemCatalogueTransmissionConfirmation is derived from the message data type TradeItemCatalogueTemplateMessage. The structure is identical to TradeItemCatalogueTemplateMessage.

Variations of the subject matter described herein and all of the functional operations described in this specification can be implemented in digital electronic circuitry, or in computer software, firmware, or hardware, including the structures disclosed in this specification and their structural equivalents, or in combinations of one or more of them. Variations of the subject matter described herein can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A computer-implemented method for managing production bills of material, the method steps performed by a processor and comprising:

generating a first message by a first application, the first application executing in an environment of computer systems providing message-based services via message-based interfaces, wherein the first message inquires for a production bill of material and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a production bill of material variant basic data by material and plant query message entity; and a selection package comprising a production bill of material variant basic data selection by material and plant entity;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a production bill of material and includes a second message package structured by the second message-based interface derived from the common business object model, and where the second message package is hierarchically organized in memory as:

a production bill of materials variant basic data by material and plant response message entity; and a production bill of material variant basic data package comprising at least one production bill of material entity, where each production bill of material entity includes an internal ID and at least one variant, and where each variant includes a material internal ID, a usage code, and a material description;

generating a third message by the first application, wherein the third message inquires for items of a variant for the particular production bill of material and includes a third message package structured by the first message-based interface derived from the common business object model and hierarchically organized in memory as:

a production bill of material variant item basic data by variant identifying elements query message entity; and a selection package comprising a production bill of material variant item basic data selection by variant identifying elements entity, where the production bill of material variant item basic data selection by variant identifying elements entity includes a material internal ID, a plant ID, and a production bill of material variant usage code; and processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and, wherein the fourth message comprises a production bill of material and includes a fourth message package structured by the second message-based interface derived from the common business object model and hierarchically organized in memory as:

a production bill of material variant item basic data by variant identifying elements response message entity; and a production bill of material package comprising a production bill of material entity, where the production bill of material entity includes an internal ID and a variant, further where the variant includes an ID, a material internal ID, a validity date, a usage code, a material description, and a usage name.

2. A computer-implemented method for managing supply planning areas, the method steps performed by a processor and comprising:

generating a first message by a first application, the first application executing in an environment of computer systems providing message-based services via message-based interfaces, wherein the first message inquires for a list of supply planning areas and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a supply planning area by location ID and location type code query message entity; and a selection package comprising a supply planning area selection by location ID and location type code entity, the supply planning area selection by location ID and location type code entity including at least one of a selection by location internal ID or a selection by location type code; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message includes a second message package structured by the second message-based interface derived from the common business object model, and where the second message package is hierarchically organized in memory as:

a supply planning area by location ID and location type code response message entity; and a supply planning area package comprising at least one supply planning area entity, where each supply planning area entity includes an ID and a location, further where the location includes an internal ID and a type code.

3. A computer-implemented method for exchanging data about available products between vendors and retailers, the method steps performed by a processor and comprising:

generating a first message by a first application, the first application executing in an environment of computer systems providing message-based services via message-based interfaces, wherein the first message requests a subscription for the first application to a recipient data pool and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a trade item catalogue subscription request message entity; and a trade item catalogue package comprising at least one trade item catalogue entity and a party package, where each trade item catalogue entity includes an action code, a creation date time, and a catalogue ID, and further where the party package includes a recipient party and a source party; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message includes a second message package structured by the second message-based interface derived from the common business object model, and where the second message package is hierarchically organized as:

a trade item catalogue subscription confirmation message entity; and a trade item catalogue package comprising at least one trade item catalogue entity and a party package, where each trade item catalogue entity includes an action code, a creation date time, and a catalogue ID, and further where the party package includes a recipient party and a source party.

4. A computer-implemented method for planning the transportation of a certain quantity of a product from the stock of a source location, the method steps performed by a processor and comprising:

generating a first message by a first application, the first application executing in an environment of computer systems providing message-based services via message-based interfaces, wherein the first message requests creation of a stock transport planning order and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a stock transport planning order create request message entity; and a stock transport planning order package comprising a stock transport planning order entity and a stock transport planning order item package, where the stock transport planning order entity includes a planning version ID, where the stock transport planning order item package includes a stock transport planning order item entity, and where the stock transport planning order item entity includes a stock transport planning order item schedule line package, product internal ID, a target location internal ID, a source location internal ID, and a transport means description code;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message comprises a confirmation and includes a second message package structured by the second message-based interface derived from the common business object model, and where the second message package is hierarchically organized in memory as:

a stock transport planning order create confirmation message; and a log package comprising a log entity;

generating a third message by the first application, wherein the third message requests a stock transport planning order by ID and includes a third message package structured by the first message-based interface derived from the common business object model and hierarchically organized in memory as:

a stock transport planning order by ID query message entity; and a selection package comprising a stock transport planning order selection by ID entity, where the stock transport planning order selection by ID entity includes a stock transport planning order ID;

processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message comprises a response to the stock transport planning order by ID request and includes a fourth message package structured by the second message-based interface derived from the common business object model and hierarchically organized in memory as:

a stock transport planning order by ID response message entity; and a stock transport planning order package;

determining that the particular transport planning order is one of changed or cancelled; and if the particular stock transport planning order is changed:

generating a fifth message by the first application, wherein the fifth message requests that the particular stock transport planning order be changed and includes a fifth message package structured by the first message-based interface derived from the common business object model and hierarchically organized in memory as:

a stock transport planning order change request message entity; and a stock transport planning order package comprising a stock transport planning order entity and a stock transport planning order item package, where the stock transport planning order entity includes an ID and where the stock transport planning order item package includes a stock transport planning order item schedule line package; and processing, via the first message-based interface, a sixth message received from the second application in response to the second application's processing of the fifth message according to the hierarchical organization of the fifth message package via the second message-based interface, where processing the fifth message by the second message-based interface includes unpacking the fifth message package based on the common business object model, and wherein the sixth message confirms the change and includes a sixth message package hierarchically organized in memory as:

a stock transport planning order change confirmation message entity; and a stock transport planning order package and a log package, where the log package includes a log entity;

and if the particular stock transport planning order is cancelled:

generating a fifth message by the first application, wherein the fifth message requests that the particular stock transport planning order be cancelled and includes a fifth message package structured by the first message-based interface derived from the common business object model and hierarchically organized in memory as:

a stock transport planning order cancel request message entity; and a stock transport planning order package comprising a stock transport planning order entity, where the stock transport planning order includes an ID; and processing, via the first message-based interface, a sixth message received from the second application in response to the second application's processing of the fifth message according to the hierarchical organization of the fifth message package via the second message-based interface, where processing the fifth message by the second message-based interface includes unpacking the fifth message package based on the common business object model, and wherein the sixth message confirms the cancellation and includes a sixth message package structured by the second message-based interface derived from the common business object model and hierarchically organized in memory as:

a stock transport planning order cancel confirmation message entity; and a log package comprising a log entity.

5. A computer-implemented method for managing customer returns, the method steps performed by a processor and comprising:

generating a first message by a first application, the first application executing in an environment of computer systems providing message-based services via message-based interfaces, wherein the first message requests creation of a customer return object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a customer return create request message entity; and a customer return package comprising a customer return entity, a party package, and a sales terms package, where the customer return entity includes a processing type code, where the party package includes a buyer party entity and a sales organization party entity, and where the sales terms package includes a sales terms entity; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

a customer return create confirmation message entity; and a log package comprising a log entity.

6. A computer-implemented method for managing procurement planning orders, the method steps performed by a processor and comprising:

generating a first message by a first application, the first application executing in an environment of computer systems providing message-based services via message-based interfaces, wherein the first message requests creation of a procurement planning order object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a procurement planning order create request message entity; and a procurement planning order comprising a procurement planning order entity and a procurement planning order item package, where the procurement planning order entity includes a planning version ID, and where the procurement planning order item package includes a procurement planning order item entity and a procurement planning order item schedule line, where the procurement planning order item entity includes a product internal ID and a location internal ID, where the procurement planning order item schedule line package includes a procurement planning order item schedule line entity, and where the procurement planning order item schedule line entity includes a quantity, a fixed indicator, and an availability date time;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

a procurement planning order create confirmation message entity; and a log package comprising a log entity;

determining that the particular procurement planning order is changed; and generating a third message by the first application, wherein the third message requests that the particular procurement planning order object be changed and includes a third message package structured by the first message-based interface derived from the common business object model and hierarchically organized in memory as:

a procurement planning order change request message entity; and a procurement planning order package comprising a procurement planning order entity and a procurement planning order item package, where the procurement planning order entity includes an ID, where the procurement planning order item package includes a procurement planning order item entity and a procurement planning order item schedule line package, and where the procurement planning order item schedule line package includes a procurement planning order item schedule line entity; and processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message confirms the change and includes a fourth message package structured by the second message-based interface derived from the common business object model and hierarchically organized in memory as:

a procurement planning order change confirmation message entity; and a log package comprising a log entity.

7. A computer-implemented method for identifying a production order based on incomplete information, the method steps performed by a processor and comprising:

generating a first message by a first application, the first application executing in an environment of computer systems providing message-based services via message-based interfaces, wherein the first message requests a production order and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a production order simple by elements query message entity; and a production order simple selection by elements package comprising a production order simple selection by elements entity, where the production order simple selection by elements entity includes an ERP production order required indicator, an ERP process order required indicator, and at least one of the following:

a selection by plant ID, a selection by supply planning area ID, a selection by material ID, a selection by material requirements planning controller ID, a selection by production scheduler ID, a selection by sales order ID, a selection by project work breakdown structure element, and a selection by production order type code; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message includes a second message package structured by the second message-based interface derived from the common business object model, and where the second message package is hierarchically organized in memory as:

a production order simple by elements response message entity; and a log package comprising a log entity.

8. A computer-implemented method for managing production proposals, the method steps performed by a processor and comprising:

generating a first message by a first application, the first application executing in an environment of computer systems providing message-based services via message-based interfaces, wherein the first message requests creation of a production proposal object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a production proposal create request message entity; and a production proposal package comprising a production proposal entity, where the production proposal entity includes a planning version ID, a location internal ID, a product internal ID, a quantity ID, an availability date time, a source of supply reference, and a fixed indicator; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

a production proposal create confirmation message entity; and a log package comprising a log entity.

9. A computer-implemented method for managing production planning orders for Supply Chain Management (SCM), the method steps performed by a processor and comprising:

generating a first message by a first application, the first application executing in an environment of computer systems providing message-based services via message-based interfaces, wherein the first message requests creation of a production planning order object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a production planning order create request message entity; and a production planning order package comprising a production planning order entity and a component package, where the production planning order entity includes a planning version ID and a supply planning area ID, and where the component package includes at least one material output entity, where each material output entity includes a product internal ID, a supply planning area ID, an availability date time, and a planned quantity;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

a production planning order create confirmation message entity; and a log package comprising a log entity;

determining that the particular procurement planning order is changed;

generating a third message by the first application, wherein the third message requests that the particular procurement planning order object be changed and includes a third message package structured by the first message-based interface derived from the common business object model and hierarchically organized in memory as:

a production planning order change request message entity; and a production planning order package comprising a production planning order entity and a component package, where the production planning order entity includes an ID, and where the component package includes at least one material output entity, where each material output entity includes a product internal ID, an availability date time, a planned quantity, a priority value, and a fixed indicator; and processing, via the first message-based interface, a fourth message from the second application in response to the second application's processing of the third message according to the hierarchical organization of the third message package via the second message-based interface, where processing the third message by the second message-based interface includes unpacking the third message package based on the common business object model, and wherein the fourth message confirms the change and includes a fourth message package structured by the second message-based interface derived from the common business object model and hierarchically organized in memory as:

a production planning order change confirmation message entity; and a log package comprising a log entity.

10. A computer-implemented method for managing equipment resources, the method steps performed by a processor and comprising:

generating a first message by a first application, the first application executing in an environment of computer systems providing message-based services via message-based interfaces, wherein the first message requests creation of an equipment resource object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

an equipment resource create request message entity; and an equipment resource package, a description package, a capacity package, and a reference package, the equipment resource package comprising an equipment resource entity, the description package comprising a description entity, the capacity package comprising a downtime entity and a capacity and scheduling information entity, and the reference package comprising a location entity;

processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

an equipment resource create confirmation message entity; and an equipment resource package and a log package, the equipment resource package comprising an equipment resource entity and the log package comprising a log entity; and determining that the particular equipment resource is one of changed or deactivated; and if the particular equipment resource is changed:

generating a third message by the first application, wherein the third message requests that the particular equipment resource object be changed and includes a third message package structured by the first message-based interface derived from the common business object model and hierarchically organized in memory as:

an equipment resource change request message entity; and an equipment resource package comprising an equipment resource entity, where the equipment resource entity includes an ID, a description package, a downtime package, and a capacity and scheduling information package; and processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message confirms the change and includes a fourth message package structured by the second message-based interface derived from the common business object model and hierarchically organized in memory as:

an equipment resource change confirmation message entity; and an equipment resource package and a log package, the equipment resource package comprising an equipment resource entity and the log package comprising a log entity; and if the particular equipment resource is deactivated:

generating a third message by the first application, wherein the third message requests that the particular equipment resource object be deactivated and includes a third message package structured by the first message-based interface derived from the common business object model and hierarchically organized in memory as:

an equipment resource deactivate request message entity; and an equipment resource package comprising an equipment resource entity, where the equipment resource entity includes an ID; and processing, via the first message-based interface, a fourth message received from the second application in response to the second application's processing of the third message according to the hierarchical organization of the third message package via the second message-based interface, where processing the third message by the second message-based interface includes unpacking the third message package based on the common business object model, and wherein the fourth message confirms the deactivation of the particular equipment resource object and includes a fourth message package structured by the second message-based interface derived from the common business object model and hierarchically organized in memory as:

an equipment resource deactivate confirmation message entity; and an equipment resource package and a log package, the equipment resource package comprising an equipment resource entity and the log package comprising a log entity.

11. A computer-implemented method for processing productivity, the method steps performed by a processor and comprising:

generating a first message by a first application, the first application executing in an environment of computer systems providing message-based services via message-based interfaces, wherein the first message requests creation of a productivity confirmation object and includes a first message package structured by a first message-based interface associated with the first application, the first message-based interface derived from a common business object model, where the common business object model includes business objects having relationships that enable derivation of message-based interfaces and message packages, and where the first message package is hierarchically organized in memory as:

a production confirmation create request message entity; and a production confirmation package comprising a production confirmation entity and a good movement package, where the production confirmation entity includes a record type code; and processing, via the first message-based interface, a second message received from a heterogeneous second application in response to the second application's processing of the first message according to the hierarchical organization of the first message package via a second message-based interface derived from the common business object model, where processing the first message by the second message-based interface includes unpacking the first message package based on the common business object model, the second application executing in the environment of computer systems providing message-based services, wherein the second message confirms the creation and includes a second message package structured by the second message-based interface derived from the common business object model, and where the second message package is hierarchically organized in memory as:

a production confirmation create confirmation message entity; and a log package comprising a log entity.

* * * * *